US009262913B2

(12) United States Patent
Yamada et al.

(10) Patent No.: US 9,262,913 B2
(45) Date of Patent: Feb. 16, 2016

(54) COMMUNICATION DEVICE

(71) Applicant: Panasonic Intellectual Property Corporation of America, Torrance, CA (US)

(72) Inventors: Kazunori Yamada, Aichi (JP); Kohei Yamaguchi, Kanagawa (JP); Shigehiro Iida, Osaka (JP); Mizuho Sakakibara, Tokyo (JP); Toshiaki Ohnishi, Kyoto (JP); Masaru Yamaoka, Osaka (JP); Mitsuaki Oshima, Kyoto (JP); Tomoaki Ohira, Tokyo (JP); Michihiro Matsumoto, Shiga (JP); Tsutomu Mukai, Osaka (JP); Yosuke Matsushita, Osaka (JP); Shohji Ohtsubo, Osaka (JP); Hironori Nakae, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/698,947

(22) Filed: Apr. 29, 2015

(65) Prior Publication Data

US 2015/0310736 A1 Oct. 29, 2015

Related U.S. Application Data

(62) Division of application No. 13/989,252, filed as application No. PCT/JP2011/006583 on Nov. 25, 2011, now Pat. No. 9,047,759.

(60) Provisional application No. 61/521,813, filed on Aug. 10, 2011.

(30) Foreign Application Priority Data

| | | |
|---|---|---|
| Nov. 25, 2010 | (JP) | 2010-262993 |
| Nov. 26, 2010 | (WO) | PCT/JP2010/006901 |
| Jun. 13, 2011 | (JP) | 2011-131653 |
| Aug. 10, 2011 | (JP) | 2011-175453 |
| Oct. 31, 2011 | (JP) | 2011-238148 |
| Oct. 31, 2011 | (JP) | 2011-238149 |
| Nov. 15, 2011 | (JP) | 2011-250170 |

(51) Int. Cl.

| | |
|---|---|
| ***H04B 10/00*** | (2013.01) |
| ***G08C 23/04*** | (2006.01) |

(52) U.S. Cl.

CPC ............ *G08C 23/04* (2013.01); *G08C 2201/32* (2013.01); *G08C 2201/70* (2013.01)

(58) Field of Classification Search

CPC ............. H04B 10/116; H04B 10/1143; H04B 10/1149; H04N 21/4223; H04L 12/2803; H04L 2012/2841; H04M 1/7253

USPC ................. 455/41.2, 41.1, 67.11, 448, 556.1; 398/118, 126

See application file for complete search history.

(56) References Cited

U.S. PATENT DOCUMENTS

| | | | |
|---|---|---|---|
| 5,648,813 | A | 7/1997 | Tanigawa et al. |
| 5,941,930 | A | 8/1999 | Morimoto et al. |

(Continued)

FOREIGN PATENT DOCUMENTS

| | | |
|---|---|---|
| CN | 1524252 | 8/2004 |
| JP | 07-135689 | 5/1995 |

(Continued)

OTHER PUBLICATIONS

Office Action and Search Report issued Aug. 17, 2015 in corresponding Chinese Application No. 201180056560.3, with partial English translation.

(Continued)

*Primary Examiner* — Sonny Trinh

(74) *Attorney, Agent, or Firm* — Wenderoth, Lind & Ponack, L.L.P.

(57) ABSTRACT

A mobile device includes a position sensing unit, a remote control information obtainment unit, and a storage unit. Position information obtained by the position sensing unit is stored in the storage unit in association with remote control information. The mobile device further includes a directional space obtainment unit and an apparatus specification unit. The mobile device recognizes a direction pointed by a user using the mobile device, and enables operation of a terminal apparatus existing in the pointing direction.

2 Claims, 705 Drawing Sheets

(56) References Cited

U.S. PATENT DOCUMENTS

| | | | | |
|---|---|---|---|---|
| 6,118,442 | A | 9/2000 | Tanigawa | |
| 6,148,211 | A | 11/2000 | Reed et al. | |
| 6,348,956 | B1 | 2/2002 | Tanigawa et al. | |
| 6,992,612 | B2 | 1/2006 | Pessina et al. | |
| 7,028,410 | B2 | 4/2006 | Sato et al. | |
| 7,139,562 | B2 | 11/2006 | Matsui | |
| 7,415,212 | B2 * | 8/2008 | Matsushita | G06F 3/002 250/206.1 |
| 7,593,739 | B2 | 9/2009 | Oguri et al. | |
| 7,932,882 | B2 | 4/2011 | Shimotono et al. | |
| 7,945,174 | B2 * | 5/2011 | Shpantzer | H04B 10/11 398/203 |
| 8,214,459 | B2 | 7/2012 | Matsubara et al. | |
| 8,400,530 | B2 | 3/2013 | Ikeda et al. | |
| 8,504,008 | B1 | 8/2013 | Gossweiler et al. | |
| 8,515,413 | B1 | 8/2013 | Schilit et al. | |
| 8,549,109 | B2 | 10/2013 | Matsubara et al. | |
| 8,560,012 | B2 | 10/2013 | Ohnishi et al. | |
| 8,627,075 | B2 | 1/2014 | Ikeda et al. | |
| 8,692,905 | B2 | 4/2014 | Ikeda et al. | |
| 8,811,897 | B2 * | 8/2014 | Matsumoto | G06K 19/0707 235/439 |
| 8,831,514 | B2 | 9/2014 | Tysowski | |
| 8,854,320 | B2 | 10/2014 | Hirata et al. | |
| 8,880,028 | B2 * | 11/2014 | Han | H04M 1/7253 235/492 |
| 8,892,688 | B2 | 11/2014 | Matsubara et al. | |
| 8,943,605 | B1 | 1/2015 | Martin et al. | |
| 8,998,076 | B2 * | 4/2015 | Chang | G06F 11/0742 235/375 |
| 2002/0047945 | A1 | 4/2002 | Tanigawa et al. | |
| 2003/0015302 | A1 | 1/2003 | Pessina et al. | |
| 2003/0187922 | A1 | 10/2003 | Ohara | |
| 2004/0121725 | A1 | 6/2004 | Matsui | |
| 2004/0161246 | A1 * | 8/2004 | Matsushita | G06F 3/002 398/187 |
| 2005/0143148 | A1 | 6/2005 | Sato et al. | |
| 2006/0004743 | A1 | 1/2006 | Murao et al. | |
| 2006/0247890 | A1 | 11/2006 | Oguri et al. | |
| 2007/0197236 | A1 | 8/2007 | Ahn et al. | |
| 2008/0129666 | A1 | 6/2008 | Shimotono et al. | |
| 2008/0238653 | A1 | 10/2008 | Unger | |
| 2008/0309464 | A1 | 12/2008 | Chihara | |
| 2009/0081950 | A1 | 3/2009 | Matsubara et al. | |
| 2010/0081375 | A1 | 4/2010 | Rosenblatt et al. | |
| 2010/0283586 | A1 | 11/2010 | Ikeda et al. | |
| 2011/0007901 | A1 | 1/2011 | Ikeda et al. | |
| 2011/0032202 | A1 | 2/2011 | Aoyagi et al. | |
| 2011/0187660 | A1 | 8/2011 | Hirata et al. | |
| 2011/0312278 | A1 | 12/2011 | Matsushita et al. | |
| 2012/0019674 | A1 | 1/2012 | Ohnishi et al. | |
| 2012/0094596 | A1 | 4/2012 | Tysowski | |
| 2012/0246687 | A1 | 9/2012 | Matsubara et al. | |
| 2012/0302166 | A1 * | 11/2012 | Yamaoka | H04W 8/22 455/41.1 |
| 2013/0038634 | A1 | 2/2013 | Yamada et al. | |
| 2013/0052946 | A1 | 2/2013 | Chatterjee et al. | |
| 2013/0196591 | A1 | 8/2013 | Ikeda et al. | |
| 2013/0198056 | A1 | 8/2013 | Aldrey et al. | |
| 2013/0218451 | A1 | 8/2013 | Yamada | |
| 2013/0247117 | A1 | 9/2013 | Yamada et al. | |
| 2013/0331027 | A1 | 12/2013 | Rose et al. | |
| 2014/0009268 | A1 | 1/2014 | Oshima et al. | |
| 2014/0020032 | A1 | 1/2014 | Matsubara et al. | |
| 2014/0105397 | A1 | 4/2014 | Ikeda et al. | |
| 2014/0152856 | A1 | 6/2014 | Ikeda et al. | |
| 2014/0206381 | A1 | 7/2014 | Yamada et al. | |
| 2014/0213290 | A1 | 7/2014 | Yamada | |
| 2014/0287682 | A1 * | 9/2014 | Minemura | H04W 88/10 455/41.1 |
| 2015/0019970 | A1 | 1/2015 | Matsubara et al. | |
| 2015/0230056 | A1 * | 8/2015 | Shin | H04W 4/008 455/420 |
| 2015/0244458 | A1 * | 8/2015 | Erkmen | H04B 10/1129 398/122 |

FOREIGN PATENT DOCUMENTS

| | | |
|---|---|---|
| JP | 08-094378 | 4/1996 |
| JP | 09-116985 | 5/1997 |
| JP | 10-215244 | 8/1998 |
| JP | 10-300493 | 11/1998 |
| JP | 11-295409 | 10/1999 |
| JP | 2000-250434 | 9/2000 |
| JP | 2000-270237 | 9/2000 |
| JP | 2001-249899 | 9/2001 |
| JP | 2001-516999 | 10/2001 |
| JP | 2001-349742 | 12/2001 |
| JP | 2002-87536 | 3/2002 |
| JP | 2003-234840 | 8/2003 |
| JP | 2003-279354 | 10/2003 |
| JP | 2003-296273 | 10/2003 |
| JP | 2003-345492 | 12/2003 |
| JP | 2004-048132 | 2/2004 |
| JP | 2004-145720 | 5/2004 |
| JP | 2004-166193 | 6/2004 |
| JP | 2004-201031 | 7/2004 |
| JP | 2004-258766 | 9/2004 |
| JP | 2004-297334 | 10/2004 |
| JP | 2005-315650 | 11/2005 |
| JP | 2005-354543 | 12/2005 |
| JP | 2006-099540 | 4/2006 |
| JP | 2006-146753 | 6/2006 |
| JP | 2006-266945 | 10/2006 |
| JP | 2006-279424 | 10/2006 |
| JP | 2006-308472 | 11/2006 |
| JP | 2006-309500 | 11/2006 |
| JP | 2007-43316 | 2/2007 |
| JP | 2007-134962 | 5/2007 |
| JP | 3915654 | 5/2007 |
| JP | 2007-228497 | 9/2007 |
| JP | 2007-304787 | 11/2007 |
| JP | 2007-334901 | 12/2007 |
| JP | 2008-017027 | 1/2008 |
| JP | 2008-070236 | 3/2008 |
| JP | 2008-070884 | 3/2008 |
| JP | 2008-139711 | 6/2008 |
| JP | 2008-170309 | 7/2008 |
| JP | 2008-210368 | 9/2008 |
| JP | 2008-241663 | 10/2008 |
| JP | 2008-287596 | 11/2008 |
| JP | 2008-306667 | 12/2008 |
| JP | 2009-080593 | 4/2009 |
| JP | 2009-193433 | 8/2009 |
| JP | 2009-224841 | 10/2009 |
| JP | 2009-229295 | 10/2009 |
| JP | 2010-026064 | 2/2010 |
| JP | 2010-113503 | 5/2010 |
| JP | 4489719 | 6/2010 |
| JP | 2010-145228 | 7/2010 |
| JP | 2010-147847 | 7/2010 |
| JP | 2010-237030 | 10/2010 |
| JP | 2010-263506 | 11/2010 |
| JP | 2011-034538 | 2/2011 |
| JP | 2011-061247 | 3/2011 |
| JP | 5419895 | 2/2014 |
| KR | 2007-0112104 | 11/2007 |
| WO | 99/13662 | 3/1999 |
| WO | 2006/123413 | 11/2006 |
| WO | 2007/069323 | 6/2007 |
| WO | 2009/063628 | 5/2009 |
| WO | 2009/084243 | 7/2009 |

OTHER PUBLICATIONS

International Search Report issued Mar. 13, 2012 in International Application No. PCT/JP2011/006583.

Extended European Search Report issued Jan. 30, 2014 in corresponding European patent application No. 10832856.8.

Office Action issued May 22, 2014 in U.S. Appl. No. 13/203,772.

* cited by examiner

FIG. 25

```
array picArray;
                                        6006
Main(void){
        Bool cn = ConnectServer(URL);
        if(cn!=false){                      6007

                SetDownloaded(DLcomplete);
                picArray = DownloadedData(cn);
        }
        return;                                    6008
}               6009
                        6010
void DLcomplete(void){
        StartSlideShow(picArray);
        return
}
```

(a) Camera: Flowchart (Upload)

FIG. 40B
(b1)
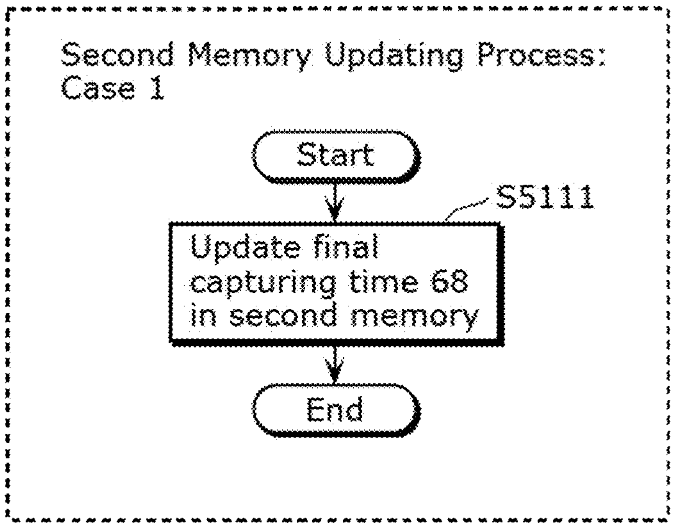
(b2)
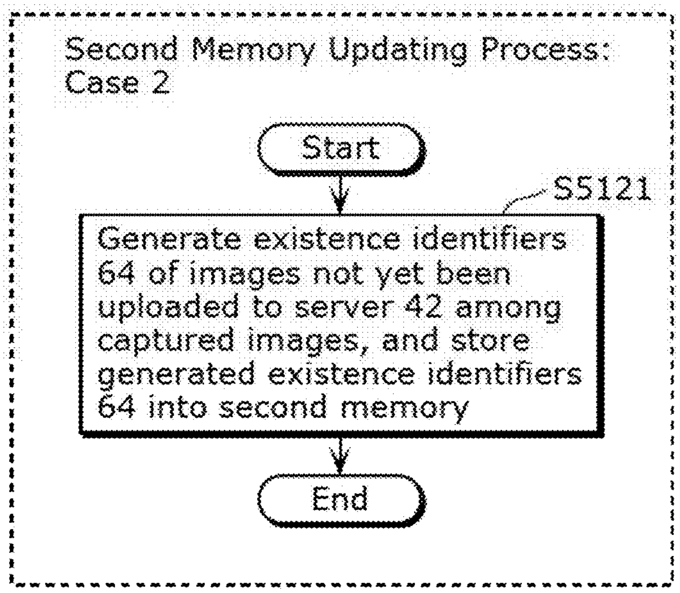

FIG. 40C
(b3)
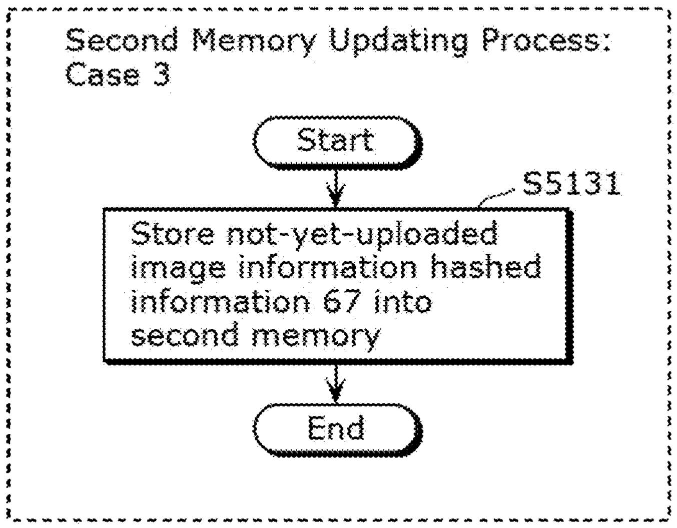
(b4)
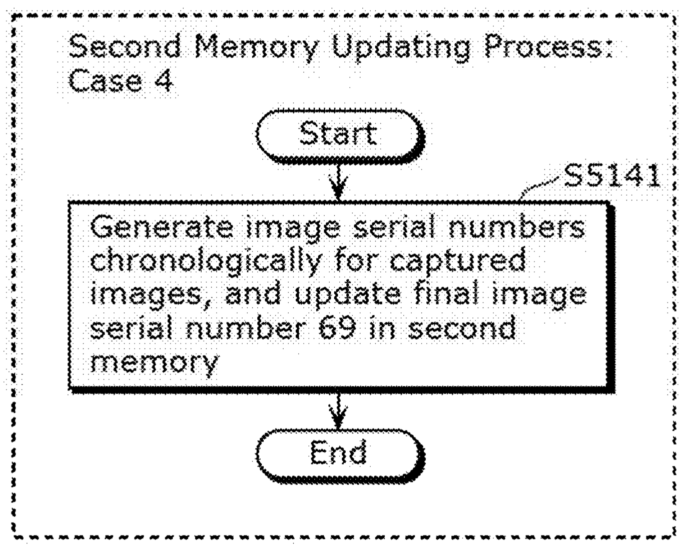

FIG. 46A
(a)
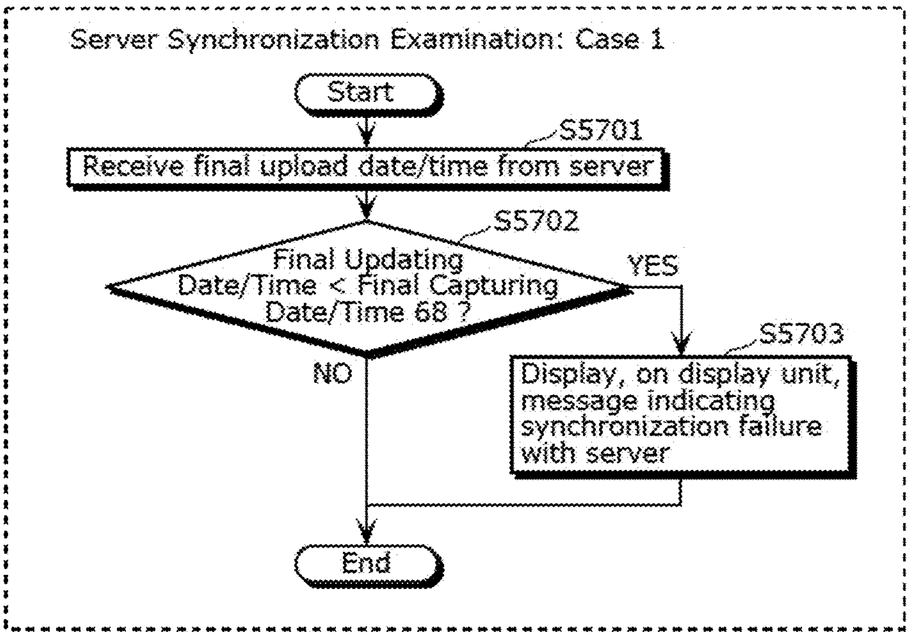
(b)
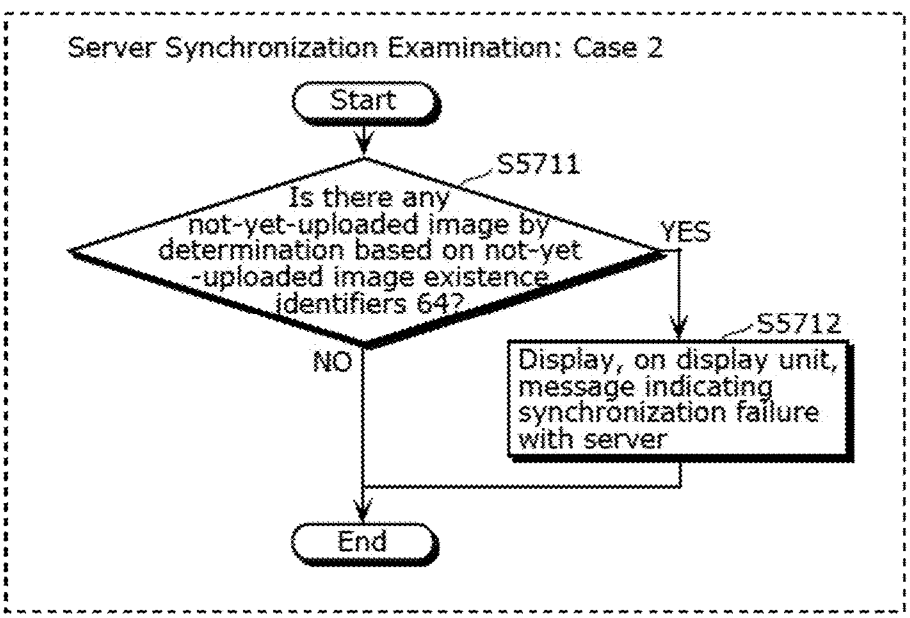

FIG. 46B
(c)
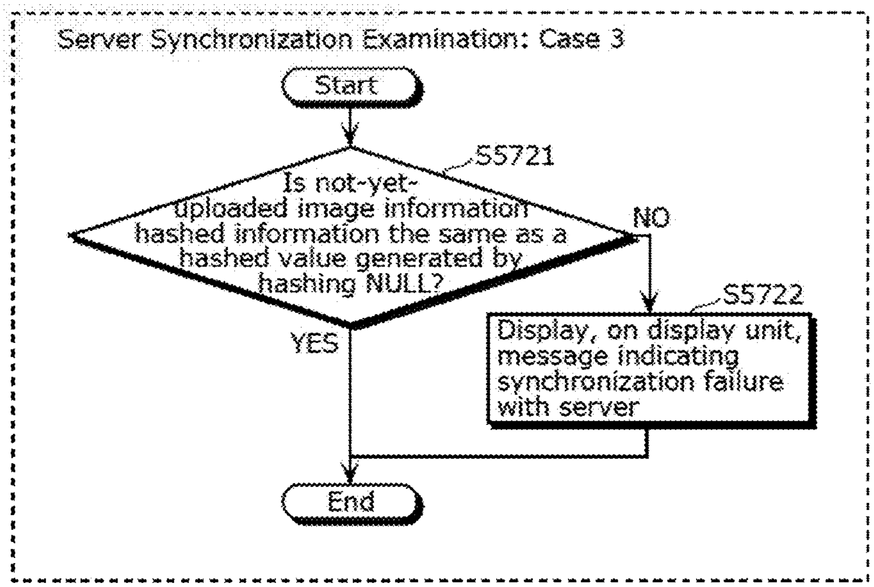
(d)
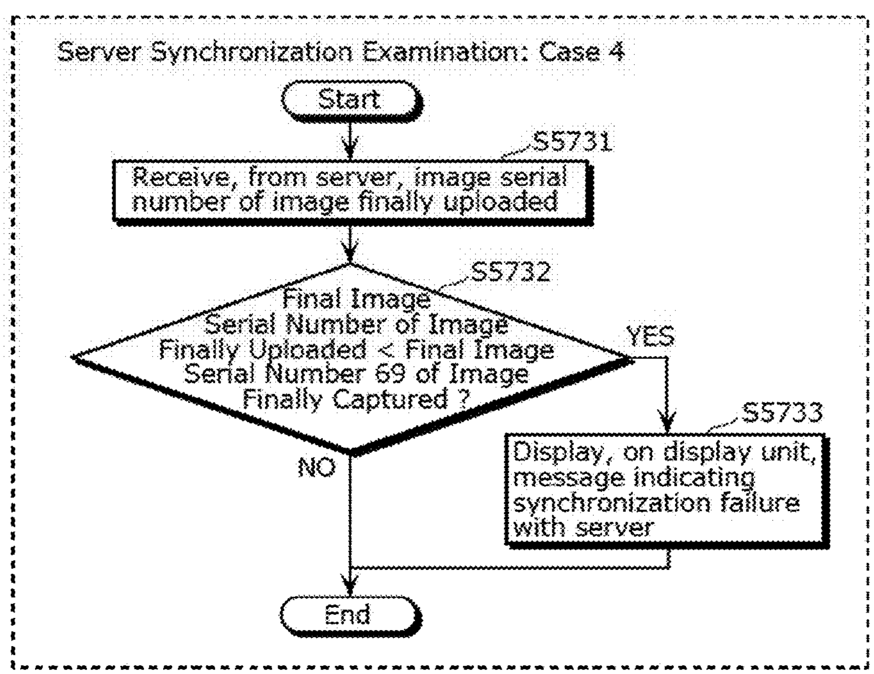

| Customer Attribute Database | | | | |
|---|---|---|---|---|
| ID | Gender | Age | Product/Service Genre | Price Range |
| 01 | Female | 20's to 30's | Reasonable Trip | ¥150,000 to ¥250,000 |
| 02 | Female | 30's to 40's | Childhood Products, Gourmet | less than ¥100,000 |
| 03 | Female | 50's to 60's | Fashion, Family Trip | ¥300,000 or more |
| 04 | Male | 20's to 30's | Reasonable Trip | ¥100,000 to ¥200,000 |
| 05 | Male | 30's to 40's | Childhood Products, Home Products | less than ¥50,000 |
| 06 | Male | 50's to 60's | Hobby, Family Trip | ¥400,000 or more |

| Electronic Catalog Database | | | |
|---|---|---|---|
| ID | Product/Service Genre | Price | Product/Service Data |
| 01 | Reasonable Trip | ¥50,000 | Korea, 3 days and 2 nights with Gourmet |
| 02 | Reasonable Trip | ¥150,000 | Hawaii, 5 days with various optional activities |
| 03 | Reasonable Trip | ¥300,000 | 3 European countries, 8 days and 7 nights, A-level hotel |
| 04 | Fashion | ¥10,000 | Apparel on Bargain Sale, limited time only |
| 05 | Fashion | ¥30,000 | Direct imported bag from Italy |
| 06 | Fashion | ¥100,000 | Jewelry selected by buyer this year |

| | |
|---|---|
| Mailing Object UID | Image server address or URL indicating Image server address |

(b)

| | |
|---|---|
| Mailing Object UID | Relay server address or URL indicating Relay server address |

(c)

| |
|---|
| Mailing Object UID |

| UID | Target Apparatus Information | Setting Information |
|---|---|---|
| UID0001 | REC-0001 | Recorder Setting Information A |
| | TV-0005 | TV Setting Information A |
| | NPC-0002 | Laptop Setting Information A |
| UID0002 | DSC-0125 | DSC Setting Information A |
| UID0003 | REC-0001 | Recorder Setting Information B |
| | TV-0083 | TV Setting Information A |
| UID0005 | DSC-0008 | DSC Setting Information B |
| UID0010 | DPC-0001 | Desktop Setting Information A |

Memory

75b

| UID |
|---|
| UID0001 |

111

| Medium Identification Information |
|---|
| Card |

2103

Apparatus Operation Information 2104 2105 2260 2106 2261 2262 2107

| Index | Operation Apparatus Identification Information | Target Apparatus Information | Operation Instruction Information | | | Communication Information |
|---|---|---|---|---|---|---|
| | | | Instruction Detail Information | Instruction Target Information | Communication Execution Information | |
| 1 | Recorder | REC-0001 | Setting Information Change | Change Target Information A | Communication is executed. | Communication Information A |
| 2 | TV | TV-0005 | Setting Information Change | Change Target Information B | Communication is executed. | Communication Information A |
| 3 | Laptop | NPC-0002 | Setting Information Change | Change Target Information C | Communication is executed. | Communication Information B |
| 4 | Camera | DSC-0008 | Setting Information Change | Change Target Information D | Communication is executed. | Communication Information C |
| 5 | Recorder | REC-0002 | Setting Information Change | Change Target Information A | Communication is not executed. | None |

FIG. 84

Memory

| UID | Medium Identification Information |
|---|---|
| UID0002 | Card |

Apparatus Operation Information

| Index | Operation Apparatus Identification Information | Target Apparatus Information | Operation Instruction Information | | | Communication Information |
|---|---|---|---|---|---|---|
| | | | Instruction Detail Information | Instruction Target Information | Communication Execution Information | |
| 1 | Recorder | All apparatuses | Setting Information Change (Timer Recording) | TV Program ID, Recording Mode | Communication is not executed. | None |
| 2 | Recorder | All apparatuses | Setting Information Change (Timer Recording) | TV Program Code, Recording Mode | Communication is executed. | URL, Login ID, Password |

FIG. 85

Memory

| UID |
|---|
| UID0003 |

| Medium Identification Information |
|---|
| Card |

Apparatus Operation Information

| Index | Operation Apparatus Identification Information | Target Apparatus Information | Operation Instruction Information | | | Communication Information |
|---|---|---|---|---|---|---|
| | | | Instruction Detail Information | Instruction Target Information | Communication Execution Information | |
| 1 | Vehicle Navigation Device | All apparatuses | Setting Information Change (Highlighted Display) | Landmark Information A (Map No. A, coordinates: xxx, yyy) | Communication is not executed. | None |
| 2 | Vehicle Navigation Device | All apparatuses | Setting Information Change (Highlighted Display) | Landmark Information B (Map No. B, coordinates: zzz, www) | Communication is not executed. | None |

FIG. 112

List of delay time in video passing

| Apparatus ID | Model | Reproduction passing information transmission method | Video server | Delay time (ms) |
|---|---|---|---|---|
| 75cfef123 | TV | NFC | Youtube/web | 2500 |
| | | | Recorder 1/LAN | 900 |
| | | | ⋮ | ⋮ |
| | | LAN | Youtube/web | 3200 |
| | | | Recorder 1/LAN | 1200 |
| | | | ⋮ | ⋮ |
| 4cad132c | pc | LAN | ⋮ | ⋮ |

Schematic diagram of data exchange using NFC

Sequence diagram of exchanging data held in mobile AV terminal 1 using NFC
(Mobile AV terminal 1 passes held data)

Sequence diagram of exchanging data held in server using NFC (Mobile AV terminal 2 obtains data from server)

Flowchart of data exchange using NFC

Apparatus information transmitted upon NFC touch

FIG. 138A

Example of data stored in record

At least one record is needed

| | | | |
|---|---|---|---|
| Message type | Activation of application for media data exchange request | | |
| Data type | Application package name | Data | Exchange Data App |
| Data type | URL | Data | http://www.panasonic.com/download/ExchangeDataApp |
| Data type | Application group name | Data | EXCHANGE_DATA |
| Data type | File path | Data | C:¥¥Users¥Document¥hoge.mpg |
| Data type | Program | Data | Binary data, script, etc. |
| Data type | GPS information | Data | lat=34.44.36.02, lon=135.26.44.35 |
| Data type | Mail address | Data | hoge@jp.panasonic.com |
| Data type | Phone number | Data | 090-XXXX-XXXX |
| Data type | Program channel | Data | 5ch |
| Data type | Account, password | Data | slida1981, passwd |
| Data type | Image | Data | Binary data, etc. |
| Data type | Amount of money | Data | ¥50,000,$500 |
| Data type | Amount billed | Data | ~¥10,500 |
| Data type | Viewing history | Data | Program name XX, broadcast time, viewing time |
| Data type | Game score | Data | 45000 points |
| Data type | Game setting | Data | Start position:stage8, character: Draemon |

FIG. 138B

| | | | |
|---|---|---|---|
| Data type | License key | Data | XXXX-XXXX-XXXX |
| Data type | Time | Data | JST 10:21 |
| Data type | Camera setting information | Data | AWB:4000, Exposure: +1,RGB:FF00FF etc. |
| Data type | Video TPS information | Data | 10 minutes 19 seconds 93 |
| Data type | Sensor information | Data | 10 (Gyroscope, acceleration sensor, geomagnetic sensor, etc.) |
| Data type | Apparatus model | Data | XP22V |
| Data type | Age | Data | 30 |
| Data type | Sex | Data | Male |
| Data type | Weather | Data | Cloudy,chance of rain 30%, temperature 21° |
| Data type | Name | Data | Matsushita taro |
| Data type | Screen size | Data | 960x540 |
| Data type | Software version | Data | v5.0.1 |
| Data type | Text | Data | Today is sunny |
| Data type | Scheduled recording information | Data | 10221 (Program code, etc.) |
| Data type | Date | Data | 2007/5/10 9:19-21:10, 2007/5/11 9:01-19:45,... |
| Data type | Music information | Data | Michael jackson THRILLER |

(2) Product Information

| | |
|---|---|
| YO1U | Part Number ID (TV Part Number, Color Information) |
| YO1Un | UID (Product Serial Number) |
| YO1Ua | Address of Registration Server (www.panasonic-server.com) |
| | Server Login ID |
| | Server Login Password |
| | Operation Program |

(b)

(3) Server Registration Information

| |
|---|
| Part Number ID (TV Part Number, Color Information) |
| UID (Product Serial Number) |
| Position Information of Mobile Terminal N20 |
| Server Login ID |
| Server Login Password |

| Part Number | UID | Position Information (Latitude, Longitude, Altitude) |
|---|---|---|
| Model Number of TV N10A | Product Serial Number of TV N10A | Latitude 139° 46.aa<br>Longitude 35° 41.bb<br>Altitude 1.cc [m] |

(b)

| Part Number | UID | Position Information (Latitude, Longitude, Altitude) |
|---|---|---|
| Model Number of TV N10A | Product Serial Number of TV N10A | Latitude 139° 46.aa<br>Longitude 35° 41.bb<br>Altitude 1.cc [m] |
| Model Number of BD Recorder N10B | Product Serial Number of BD Recorder N10B | Latitude 139° 46.dd<br>Longitude 35° 41.ee<br>Altitude 1.ff [m] |
| Model Number of Air Conditioner N10C | Product Serial Number of Air Conditioner N10C | Latitude 139° 46.gg<br>Longitude 35° 41.hh<br>Altitude 1.hh [m] |
| ⋮ | | |
| Model Number of Air Conditioner N10J | Product Serial Number of Air Conditioner N10J | Latitude 139° 46.kk<br>Longitude 35° 41.ll<br>Altitude 1.mm [m] |
| Model Number of FF Heater N10K | Product Serial Number of FF Heater N10K | Latitude 139° 46.nn<br>Longitude 35° 41.oo<br>Altitude 1.pp [m] |

FIG. 180A (1) Positional Information

| |
|---|
| Position Information |
| Second Server Login ID |
| Second Server Login Password |

FIG. 180B (2) First Product Control Information

| |
|---|
| Part Number ID (Part Number, Color Information of Air Conditioner N10J) |
| UID (Product Serial Number of Air Conditioner N10J) |
| Product Control Command (Power ON) |

FIG. 180C (3) Second Product Control Information

| |
|---|
| Part Number ID (Part Number, Color Information of TV N10A) |
| UID (Product Serial Number of TV N10A) |
| Product Control Command (Power OFF) |

FIG. 182

| Part Number ID | UID | Position Information (X-coordinate, Y-coordinate, Z-coordinate) |
| --- | --- | --- |
| Model Number of TV N10A | Product Serial Number of TV N10A | X-coordinate 0[m]<br>Y-coordinate 0[m]<br>Z-coordinate 0[m] |
| Model Number of BD Recorder N10B | Product Serial Number of BD Recorder N10B | X-coordinate a[m]<br>Y-coordinate b[m]<br>Z-coordinate c[m] |
| Model Number of Air Conditioner N10C | Product Serial Number of Air Conditioner N10C | X-coordinate d[m]<br>Y-coordinate e[m]<br>Z-coordinate f[m] |
| ⋮ | | |
| Model Number of Air Conditioner N10J | Product Serial Number of Air Conditioner N10J | X-coordinate g[m]<br>Y-coordinate h[m]<br>Z-coordinate i[m] |
| Model Number of FF Heater N10K | Product Serial Number of FF Heater N10K | X-coordinate j[m]<br>Y-coordinate k[m]<br>Z-coordinate l[m] |

FIG. 184

| Accuracy Identifier | Part Number ID | Processing to be performed when position information in re-received server registration information is different from registered position information |
|---|---|---|
| High | Air Conditioner<br>Solar Panel<br>Fire Alarm | Update position information of mobile device N20 |
| Low | TV<br>BD Recorder<br>FF Heater | Update registered position information |

FIG. 191

| Product | Accuracy Identifier O54 | Processing performed by Determination Unit O83 |
|---|---|---|
| Air Conditioner<br>Solar Panel<br>Fire Alarm<br>Built-in Dishwasher<br>Air Conditioner in Bath Room<br>⋮ | High | Determine that a position of mobile device O60 is to be corrected. |
| TV<br>BD Recorder<br>⋮ | Low | Determine that a position of mobile device O60 is not to be corrected. |

Figure 193:
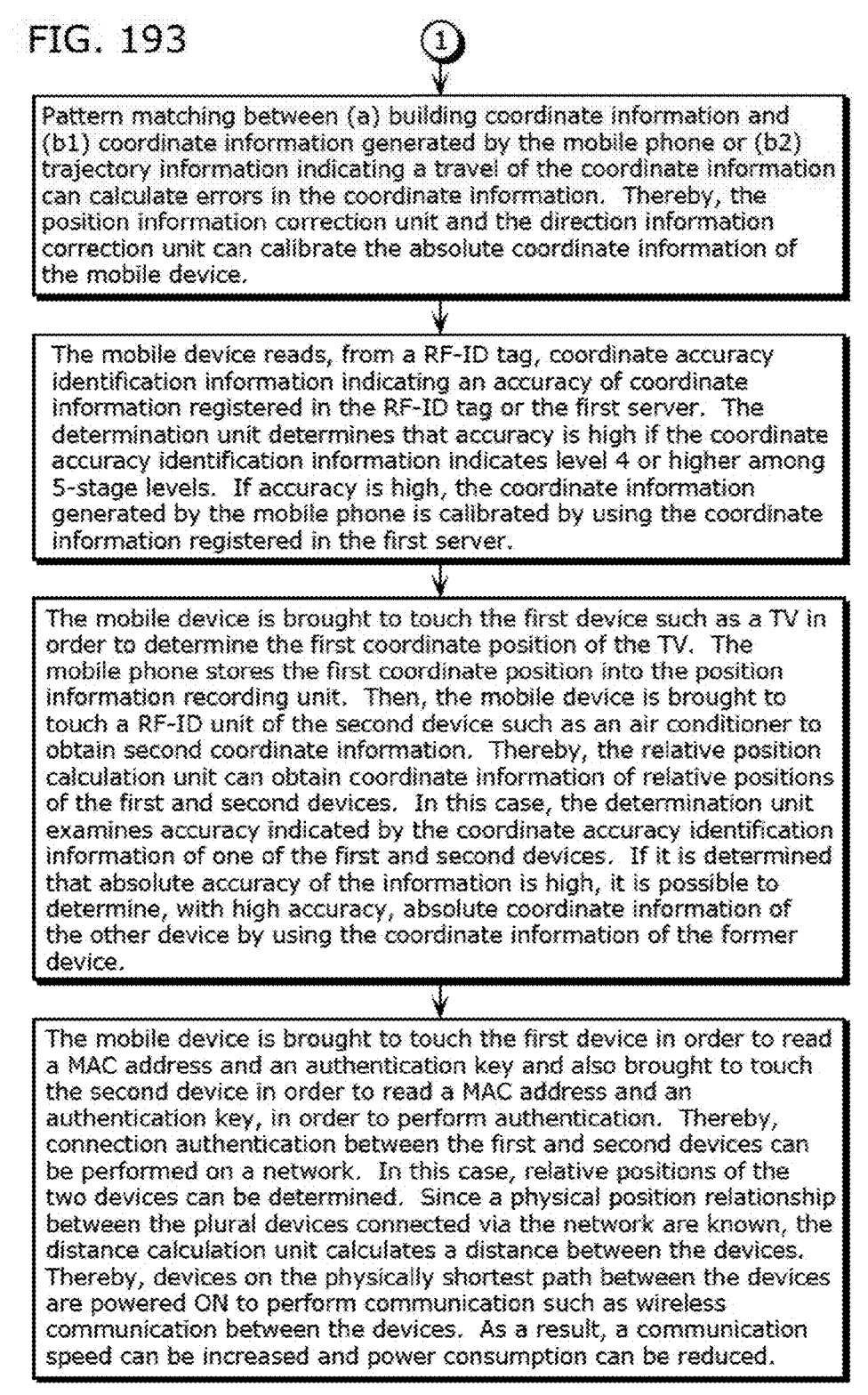

Pattern matching between (a) building coordinate information and (b1) coordinate information generated by the mobile phone or (b2) trajectory information indicating a travel of the coordinate information can calculate errors in the coordinate information. Thereby, the position information correction unit and the direction information correction unit can calibrate the absolute coordinate information of the mobile device.

↓

The mobile device reads, from a RF-ID tag, coordinate accuracy identification information indicating an accuracy of coordinate information registered in the RF-ID tag or the first server. The determination unit determines that accuracy is high if the coordinate accuracy identification information indicates level 4 or higher among 5-stage levels. If accuracy is high, the coordinate information generated by the mobile phone is calibrated by using the coordinate information registered in the first server.

↓

The mobile device is brought to touch the first device such as a TV in order to determine the first coordinate position of the TV. The mobile phone stores the first coordinate position into the position information recording unit. Then, the mobile device is brought to touch a RF-ID unit of the second device such as an air conditioner to obtain second coordinate information. Thereby, the relative position calculation unit can obtain coordinate information of relative positions of the first and second devices. In this case, the determination unit examines accuracy indicated by the coordinate accuracy identification information of one of the first and second devices. If it is determined that absolute accuracy of the information is high, it is possible to determine, with high accuracy, absolute coordinate information of the other device by using the coordinate information of the former device.

↓

The mobile device is brought to touch the first device in order to read a MAC address and an authentication key and also brought to touch the second device in order to read a MAC address and an authentication key, in order to perform authentication. Thereby, connection authentication between the first and second devices can be performed on a network. In this case, relative positions of the two devices can be determined. Since a physical position relationship between the plural devices connected via the network are known, the distance calculation unit calculates a distance between the devices. Thereby, devices on the physically shortest path between the devices are powered ON to perform communication such as wireless communication between the devices. As a result, a communication speed can be increased and power consumption can be reduced.

FIG. 198

| Product Serial Number | Product Number | Position Information | Remote Control Information | |
|---|---|---|---|---|
| | | | Operation Information | Display Information |
| P123456TV | TH-P46Z1 | First Floor Living Room (x1,y1) | Power ON:C5000<br>Power OFF:C50A0<br>Sound Volume Up:C50EF<br>⋮ | Detail Remote Control Mode |
| P456789AC | CS-X500 | Second Floor Bed Room (x3,y2) | Power ON:C5900<br>Power OFF:C59A0<br>Temperature Up:C59EF<br>⋮ | Simple Remote Control Mode |
| P789012WA | NA-VR5600 | First Floor Dressing Room (x3,y3) | Power ON:C7200<br>Washing Start:C72CE<br>Drying Start:C723D<br>⋮ | Simple Remote Control Mode |
| ⋮ | ⋮ | ⋮ | | ⋮ |

FIG. 234

5206a: Is it determined that direct communication is difficult in the case where distance or obstacle between apparatus and SEG is large based on 3D coordinate information of SEG and 3D coordinate information of apparatus to be connected by server (controller) when mobile terminal or the like is connected to server?

Yes

5206b: Server searches for PAN coordinator as relay device between apparatus and SEG based on 3D coordinate information of relay devices, and notifies position information of relay device to mobile terminal 5206c: When necessary, mobile terminal is touched to apparatus again, to obtain MAC address, network ID (e.g. PAN ID), communication protocol, communication key, and 3D coordinates of apparatus Yes 5206d: Does mobile terminal have network configuration information such as MAC address and network ID (e.g. PAN ID) of SEG?

Yes / No

5206e: Operator moves to and touches mobile terminal to SEG to obtain MAC address, IP address, network ID, communication protocol, communication key (and 3D coordinates again). Server optimizes configuration of whole network (MAC address of each child device, network ID (PAN ID) of sub-network) using 3D coordinate information of each apparatus, AEG, and relay device, and registers configuration information in SEG

30

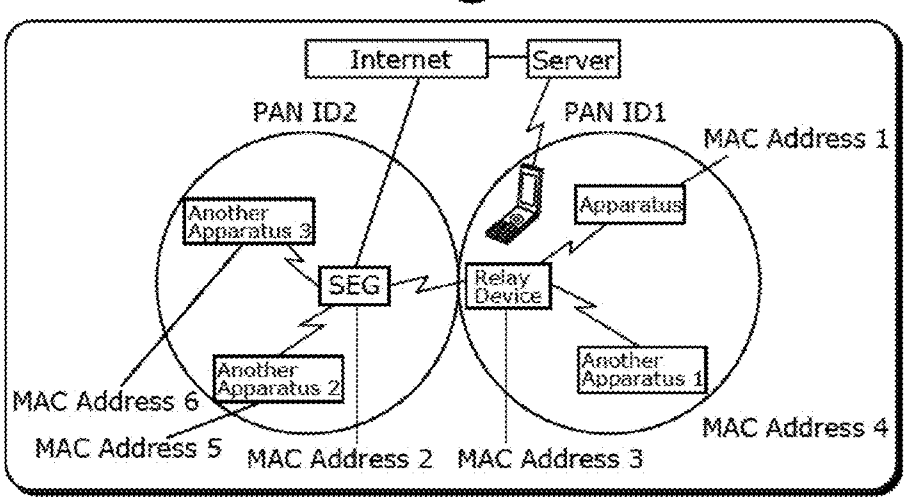

| | Reference Point 1 Entrance Door | Reference Point 2 Living Room Door | Reference Point 1 Living Room Area where two doors are close to each other |
|---|---|---|---|
| First Priority Sensor | Angular Velocity Sensor | Angular Velocity Sensor | Angular Velocity Sensor |
| Second Priority Sensor | Acceleration | Sound | None |
| Operating Time Period | 10 seconds | 10 seconds | 10 seconds |
| Time Period after Detection | 5 seconds | 3 seconds | 10 seconds |
| In-Time Discovery Percentage | 70 % | 30 % | 80 % |
| Map-Matching Error Rate | 20 % | 30 % | 30 % |
| Close Distance | 3 meters | 5 meters | 6 meters |

| ① Entrance Door | ② Living Room Door |
|---|---|
| 1. Sound Sensor | 1. Acceleration Sensor |
| 2. Acceleration Sensor | 2. Angular Velocity Sensor |
| 3. Angular Velocity Sensor | 3. Geomagnetic Sensor |
| 4. Acceleration Sensor + Angular Velocity Sensor | |
| | |

| | |
|---|---|
| Original Reference Point Accuracy | 100 points |
| Move Amount | 15 m |
| Number of Steps | 37 steps |
| Turning Amount | 1800 degrees to the left, 1890 degrees to the right |
| Elapsed Time | 15 seconds |
| Move Amount along Z-axis | 4 m, 34 m upwards (in plus direction),<br>30 m downwards (in minus direction) |
| Coordinate Accuracy Evaluation Point | 85 points |

420a

| Point | Reference Point A | TV-A | TV-B |
|---|---|---|---|
| Coordinate Accuracy Evaluation Point | 100 | 85 | 60 |

FIG. 292

| 960a | 960b | 960c | 960d | 960e | 960f | 960g | 960h | 960i | 960j |
|---|---|---|---|---|---|---|---|---|---|
| Tag ID | Signature of Tag ID | Manufacturer Code | Model, Serial Number | Key ID | URL | On-Sale Mode Identifier | Privacy Protection Identifier | Home Appliance Power Source Identifier | CPC Activation Identifier |
| ID Unique | Impossible to rewrite in factory | Recorded in factory | Impossible to rewrite in factory | Impossible to rewrite in factory | Impossible to rewrite in factory | Authentication or encryption is necessary in recording. Decryption is necessary in reproducing | Authentication or encryption is necessary in recording. | Possible to record only on home appliance CPU | Possible to record only on home appliance CPU |
| ID of Tag | signature data | manufacturer code | product model number, product serial number | shared key | URL of server to be connected to product | identifier indicating ON or OFF of on-sale mode (demonstration mode). If the identifier is ON, menu usable in mobile terminal is restricted, and more complicated and more various steps are required to register the product in server. | Not output a use history or product serial number | identifier indicating ON or OFF of power supply unit of home appliance. If the identifier is OFF, instruction for forcing power supply unit to be activated is transmitted to home appliance as needed. | identifier indicating whether or not CPC is activated. If the identifier is OFF, instruction for forcing CPU to be activated is transmitted to home appliance as needed. |

| 960k | 960m | 960n | 960p | 960q | 960r | 960s | 960t |
|---|---|---|---|---|---|---|---|
| Error Information | Use History (the number of uses, and the like) | Use History (Log Data) | Control Instruction | Customization Data | Coordinate Information | Coordinate Accuracy Evaluation Point | Coordinate Identifier |
| Possible to record only on home appliance CPU | Possible to record only on home appliance CPU | Possible to record only on home appliance CPU | Encryption is necessary in recording | | Authentication or encryption is necessary in recording. | Possible to record from home appliance CPU or terminal. Authentication or encryption is necessary in recording | |
| code indicating error of home appliance | product use history total power consumption total $CO_2$ consumption total use time period | log data of product use history Log data prior to trouble is stored. | | | 3D coordinate (position) information of production attached with tag | evaluation point indicating accuracy of 3D coordinate (position) information of production attached with tag Higher evaluation value indicates more accurate position. | Identifier indicates which the coordinates are, relative coordinate, absolute coordinate, or longitude/latitude. |

FIG. 312

M1005
Registration Server

M1208
Registration Information Database

Terminal Information Database 8510, 8511, 8512, 8513, 8514

| Terminal ID | 10001 | 10002 | 10003 | 10004 |
|---|---|---|---|---|
| Terminal Type | Mobile Terminal | TV (High Performance) | TV (High Performance) | TV (Low Performance) |
| Communi-cation device | Cellular Network: Bandwidth, Delay<br>Wireless LAN: Bandwidth, Delay | Wireless LAN: Bandwidth, Delay | Wireless LAN: Bandwidth, Delay | Ether: Bandwidth, Delay |
| Terminal Performance | Bandwidth, Delay | Bandwidth, Delay | Bandwidth, Delay | Bandwidth, Delay |
| Installed Application | Application 1<br>Application 2<br>Application 3<br>Application 4 | Application 1<br>Application 2<br>Application 3 | Application 1<br>Application 2 | Application 2<br>Application 3 |

FIG. 338

```
array picArray;

Main(void){                                6006
        Bool cn = ConnectServer(URL);
        if(cn!=false){                         6007

                SetDownloaded(DLcomplete);
                picArray = DownloadedData(cn);
        }
        return;                                        6008
}
                 6009
void DLcomplete(void){    6010
        StartSlideShow(picArray);
        return
}
```

(1)Uploading from Image Capturing Device (camera)

| | |
|---|---|
| Camera ID 5901 | Sever Address(www.panasonic-server.com) 5902 |
| Server Login ID 5903 | Server Login Password 5904 |
| Uploading-Image Number 5906 | |

(b) 5950

(2)RF-ID Communication

| | |
|---|---|
| Camera ID 5911 | Sever Address(www.panasonic-server.com) 5912 |
| Server Login ID 5913 | Server Login Password 5914 |
| Final Capturing Time (Case 1) 5915 | |
| Not-yet-Uploaded Image Data Existence Identifiers (Case 2) 5916 | |
| Not-yet-Uploaded Image Information Hashed Information (Case 3) 5917 | |
| Final Image Serial Number (Case 4) 5918 | |
| Captured Image Display Method Instruction Information 5919 | |

5928 5926

| Image ID | Upload |
|---|---|
| Sample1.jpg | Done |
| Sample2.jpg | Done |
| Sample3.jpg | Not yet |

5927 5920 5921 5922 5923 5924 5925

| Image ID | List Display | Slide Show | Print | Video Reproduction | Download | Security Password |
|---|---|---|---|---|---|---|
| Sample1.jpg | yes | automatic | disable | disable | disable | |
| Sample2.jpg | no | manual | allow | allow | allow | ×××××××× |
| Sample3.jpg | no | disable | allow | manual | disable | ○○○○○○○ |

| Customer Attribute Database | | | | |
|---|---|---|---|---|
| ID | Gender | Age | Product/Service Genre | Price Range |
| 01 | Female | 20's to 30's | Reasonable Trip | ¥150,000 to ¥250,000 |
| 02 | Female | 30's to 40's | Childhood Products, Gourmet | less than ¥100,000 |
| 03 | Female | 50's to 60's | Fashion, Family Trip | ¥300,000 or more |
| 04 | Male | 20's to 30's | Reasonable Trip | ¥100,000 to ¥200,000 |
| 05 | Male | 30's to 40's | Childhood Products, Home Products | less than ¥50,000 |
| 06 | Male | 50's to 60's | Hobby, Family Trip | ¥400,000 or more |

| Electronic Catalog Database | | | |
|---|---|---|---|
| ID | Product/Service Genre | Price | Product/Service Data |
| 01 | Reasonable Trip | ¥50,000 | Korea, 3 days and 2 nights with Gourmet |
| 02 | Reasonable Trip | ¥150,000 | Hawaii, 5 days with various optional activities |
| 03 | Reasonable Trip | ¥300,000 | 3 European countries, 8 days and 7 nights, A-level hotel |
| 04 | Fashion | ¥10,000 | Apparel on Bargain Sale, limited time only |
| 05 | Fashion | ¥30,000 | Direct imported bag from Italy |
| 06 | Fashion | ¥100,000 | Jewelry selected by buyer this year |

| UID | Target Apparatus Information | Setting Information |
|---|---|---|
| UID0001 | REC-0001 | Recorder Setting Information A |
| | TV-0005 | TV Setting Information A |
| | NPC-0002 | Laptop Setting Information A |
| UID0002 | DSC-0125 | DSC Setting Information A |
| UID0003 | REC-0001 | Recorder Setting Information B |
| | TV-0083 | TV Setting Information A |
| UID0005 | DSC-0008 | DSC Setting Information B |
| UID0010 | DPC-0001 | Desktop Setting Information A |

Memory

| UID (75) | Medium Identification Information (111) |
|---|---|
| UID0001 | Card |

2103

Apparatus Operation Information

| Index | Operation Apparatus Identification Information (2104) | Target Apparatus Information (2105) | Operation Instruction Information (2260): Instruction Detail Information | Operation Instruction Information (2260): Instruction Target Information (2106) | Operation Instruction Information (2260): Communication Execution Information (2261) | Communication Information (2107) |
|---|---|---|---|---|---|---|
| 1 | Recorder | REC-0001 | Setting Information Change | Change Target Information A | Communication is executed. | Communication Information A |
| 2 | TV | TV-0005 | Setting Information Change | Change Target Information B | Communication is executed. | Communication Information A |
| 3 | Laptop | NPC-0002 | Setting Information Change | Change Target Information C | Communication is executed. | Communication Information B |
| 4 | Camera | DSC-0008 | Setting Information Change | Change Target Information D | Communication is executed. | Communication Information C |
| 5 | Recorder | REC-0002 | Setting Information Change | Change Target Information A | Communication is not executed. | None |

Memory

| UID |
| --- |
| UID0002 |

| Medium Identification Information |
| --- |
| Card |

Apparatus Operation Information

| Index | Operation Apparatus Identification Information | Target Apparatus Information | Operation Instruction Information | | | Communication Information |
| --- | --- | --- | --- | --- | --- | --- |
| | | | Instruction Detail Information | Instruction Target Information | Communication Execution Information | |
| 1 | Recorder | All apparatuses | Setting Information Change (Timer Recording) | TV Program ID, Recording Mode | Communication is not executed. | None |
| 2 | Recorder | All apparatuses | Setting Information Change (Timer Recording) | TV Program Code, Recording Mode | Communication is executed. | URL, Login ID, Password |

FIG. 398

Memory

| UID |
| --- |
| UID0003 |

| Medium Identification Information |
| --- |
| Card |

Apparatus Operation Information

| Index | Operation Apparatus Identification Information | Target Apparatus Information | Operation Instruction Information | | | Communication Information |
| --- | --- | --- | --- | --- | --- | --- |
| | | | Instruction Detail Information | Instruction Target Information | Communication Execution Information | |
| 1 | Vehicle Navigation Device | All apparatuses | Setting Information Change (Highlighted Display) | Landmark Information A (Map No. A, coordinates: xxx, yyy) | Communication is not executed. | None |
| 2 | Vehicle Navigation Device | All apparatuses | Setting Information Change (Highlighted Display) | Landmark Information B (Map No. B, coordinates: zzz, www) | Communication is not executed. | None |

FIG. 451

| Part Number | UID | Position Information (Latitude, Longitude, Altitude) |
|---|---|---|
| Model Number of TV N10A | Product Serial Number of TV N10A | Latitude 139° 46.aa<br>Longitude 35° 41.bb<br>Altitude 1.cc [m] |

(a)

| Part Number | UID | Position Information (Latitude, Longitude, Altitude) |
|---|---|---|
| Model Number of TV N10A | Product Serial Number of TV N10A | Latitude 139° 46.aa<br>Longitude 35° 41.bb<br>Altitude 1.cc [m] |
| Model Number of BD Recorder N10B | Product Serial Number of BD Recorder N10B | Latitude 139° 46.dd<br>Longitude 35° 41.ee<br>Altitude 1.ff [m] |
| Model Number of Air Conditioner N10C | Product Serial Number of Air Conditioner N10C | Latitude 139° 46.gg<br>Longitude 35° 41.hh<br>Altitude 1.hh [m] |
| | ⋮ | |
| Model Number of Air Conditioner N10J | Product Serial Number of Air Conditioner N10J | Latitude 139° 46.kk<br>Longitude 35° 41.ll<br>Altitude 1.mm [m] |
| Model Number of FF Heater N10K | Product Serial Number of FF Heater N10K | Latitude 139° 46.nn<br>Longitude 35° 41.oo<br>Altitude 1.pp [m] |

| Part Number ID | UID | Position Information (X-coordinate, Y-coordinate, Z-coordinate) |
|---|---|---|
| Model Number of TV N10A | Product Serial Number of TV N10A | X-coordinate 0[m]<br>Y-coordinate 0[m]<br>Z-coordinate 0[m] |
| Model Number of BD Recorder N10B | Product Serial Number of BD Recorder N10B | X-coordinate a[m]<br>Y-coordinate b[m]<br>Z-coordinate c[m] |
| Model Number of Air Conditioner N10C | Product Serial Number of Air Conditioner N10C | X-coordinate d[m]<br>Y-coordinate e[m]<br>Z-coordinate f[m] |
| ⋮ | | |
| Model Number of Air Conditioner N10J | Product Serial Number of Air Conditioner N10J | X-coordinate g[m]<br>Y-coordinate h[m]<br>Z-coordinate i[m] |
| Model Number of FF Heater N10K | Product Serial Number of FF Heater N10K | X-coordinate j[m]<br>Y-coordinate k[m]<br>Z-coordinate l[m] |

FIG. 460

| Accuracy Identifier | Part Number ID | Processing to be performed when position information in re-received server registration information is different from registered position information |
|---|---|---|
| High | Air Conditioner<br>Solar Panel<br>Fire Alarm | Update position information of mobile device N20 |
| Low | TV<br>BD Recorder<br>FF Heater | Update registered position information |

FIG. 467

| Product | Accuracy Identifier O54 | Processing performed by Determination Unit O83 |
|---|---|---|
| Air Conditioner<br>Solar Panel<br>Fire Alarm<br>Built-in Dishwasher<br>Air Conditioner in Bath Room<br>⋮ | High | Determine that a position of mobile device O60 is to be corrected. |
| TV<br>BD Recorder<br>⋮ | Low | Determine that a position of mobile device O60 is not to be corrected. |

Figure 469:
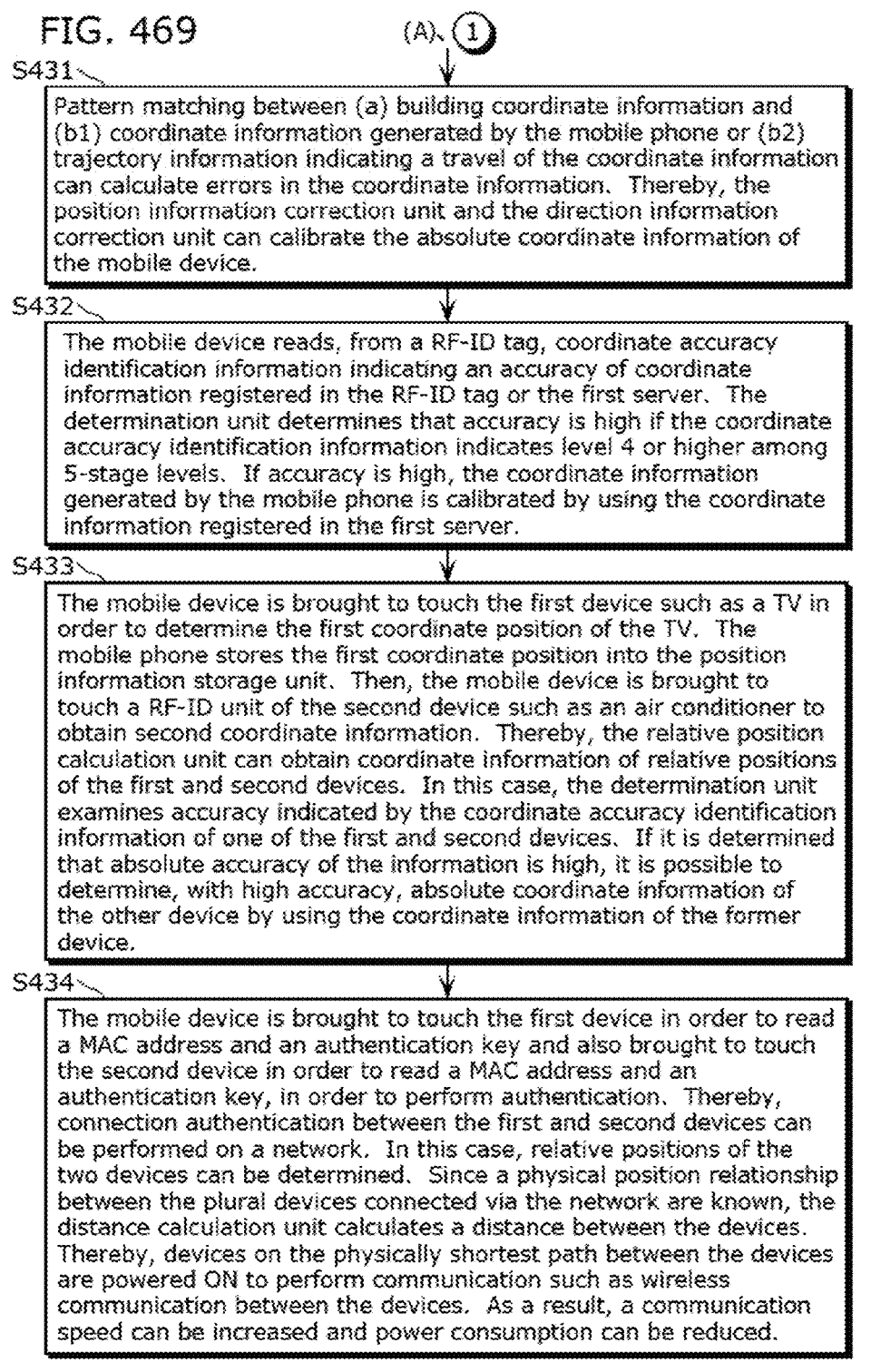

Pattern matching between (a) building coordinate information and (b1) coordinate information generated by the mobile phone or (b2) trajectory information indicating a travel of the coordinate information can calculate errors in the coordinate information. Thereby, the position information correction unit and the direction information correction unit can calibrate the absolute coordinate information of the mobile device.

S432

The mobile device reads, from a RF-ID tag, coordinate accuracy identification information indicating an accuracy of coordinate information registered in the RF-ID tag or the first server. The determination unit determines that accuracy is high if the coordinate accuracy identification information indicates level 4 or higher among 5-stage levels. If accuracy is high, the coordinate information generated by the mobile phone is calibrated by using the coordinate information registered in the first server.

S433

The mobile device is brought to touch the first device such as a TV in order to determine the first coordinate position of the TV. The mobile phone stores the first coordinate position into the position information storage unit. Then, the mobile device is brought to touch a RF-ID unit of the second device such as an air conditioner to obtain second coordinate information. Thereby, the relative position calculation unit can obtain coordinate information of relative positions of the first and second devices. In this case, the determination unit examines accuracy indicated by the coordinate accuracy identification information of one of the first and second devices. If it is determined that absolute accuracy of the information is high, it is possible to determine, with high accuracy, absolute coordinate information of the other device by using the coordinate information of the former device.

S434

The mobile device is brought to touch the first device in order to read a MAC address and an authentication key and also brought to touch the second device in order to read a MAC address and an authentication key, in order to perform authentication. Thereby, connection authentication between the first and second devices can be performed on a network. In this case, relative positions of the two devices can be determined. Since a physical position relationship between the plural devices connected via the network are known, the distance calculation unit calculates a distance between the devices. Thereby, devices on the physically shortest path between the devices are powered ON to perform communication such as wireless communication between the devices. As a result, a communication speed can be increased and power consumption can be reduced.

| Cell Position | Channel | Interfering Channel | Cell Radius |
|---|---|---|---|
| 10 North Latitude, 3 East Longitude | 1 | 2, 3, 4 | 10m |
| 9 North Latitude, 2 East Longitude | 2 | 1, 3, 7 | 8m |
| 10 North Latitude, 2 East Longitude | 3 | 1, 2, 4<br>5, 6, 7 | 10m |

FIG. 492

Table 109a

| Reference point ID | Reference noise pattern | Reference coordinates | Reference accuracy | Update time |
|---|---|---|---|---|
| p1 | Reference noise pattern 1 | X2, Y2, Z2 | 60 % | 20000202:22:10:05 |
| p2 | Reference noise pattern 2 | X3, Y3, Z3 | 80 % | 20030303:23:13:03 |

FIG. 500

Table 109b

| Reference point ID | Reference noise pattern | Reference coordinates | Reference accuracy | Movement velocity | Update time |
|---|---|---|---|---|---|
| p1 | Reference noise pattern 1 | X2, Y2, Z2 | 60 % | 1.5m/sec | 20000202:22:10:05 |
| p2 | Reference noise pattern 2 | X3, Y3, Z3 | 80 % | 1m/sec | 20030303:23:13:03 |

FIG. 501

Table 109c

| Reference point ID | Reference noise pattern | Reference coordinates | Reference accuracy | Update time |
|---|---|---|---|---|
| p1 | Reference noise pattern 1a<br>Reference noise pattern 1b | X2, Y2, Z2 | 60 % | 20000202:22:10:05<br>20000205:10:10:03 |
| p2 | Reference noise pattern 2b | X3, Y3, Z3 | 80 % | 20030303:23:13:03 |

FIG. 503

Table 109d

| Reference point ID | Reference noise pattern | Type | Reference coordinates | Reference accuracy | Update time |
|---|---|---|---|---|---|
| p1 | Reference noise pattern 1 | Disturbed | X2, Y2, Z2 | 60 % | 20000202:22:10:05 |
| p2 | Reference noise pattern 2 | Steady | X3, Y3, Z3 | 80 % | 20030303:23:13:03 |

FIG. 504 Title: Relationship between posture and screen display orientation of mobile device Title: Functional block diagram of processing unit that determines screen display orientation of mobile device (display position determination by posture detection)

(Display position determination by posture detection)

Title: Functional block diagram of centrifugal force display orientation mobile device Title: Display orientation setting from centrifugal force Correction of output of sensor in X, Y, and Z directions using direction identified from actual vertical direction Title: Setting direction with large shaking width as front direction Title: Functional block diagram of mobile device Title: Flowchart showing precess flow of coordinate estimation

FIG. 517

Title: Example of position DB

1301

| ID | Target name | Coordinates | Reference point accuracy information | Update time |
|---|---|---|---|---|
| ID-001 | TV | X2, Y2, Z2 | 60% | 20000202:22:10:05 |
| ID-002 | Vase | X3, Y3, Z3 | 80% | 20030303:23:13:03 |

Icon variations always indicating normal position of terminal (one direction only)

(A): Picture of deformed terminal

FIG. 522
Icon variations always indicating normal position of terminal (one direction only)
(B): Picture of terminal + letter
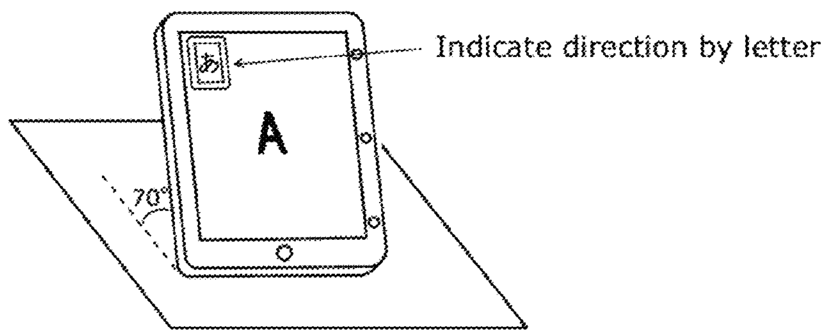
(C): Picture of terminal + Face personifying terminal
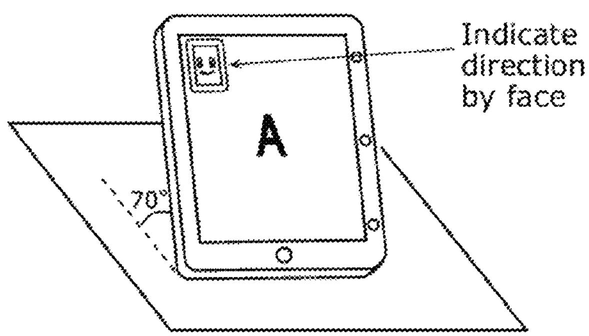
(C'): Picture of face only
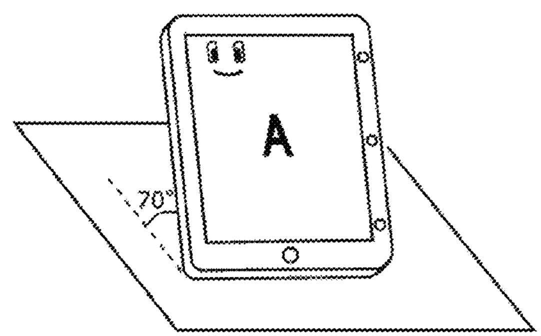

FIG. 523 Icon variations always indicating normal position of terminal (one direction only)

FIG. 524
Icon variations indicating two normal positions
Basic form
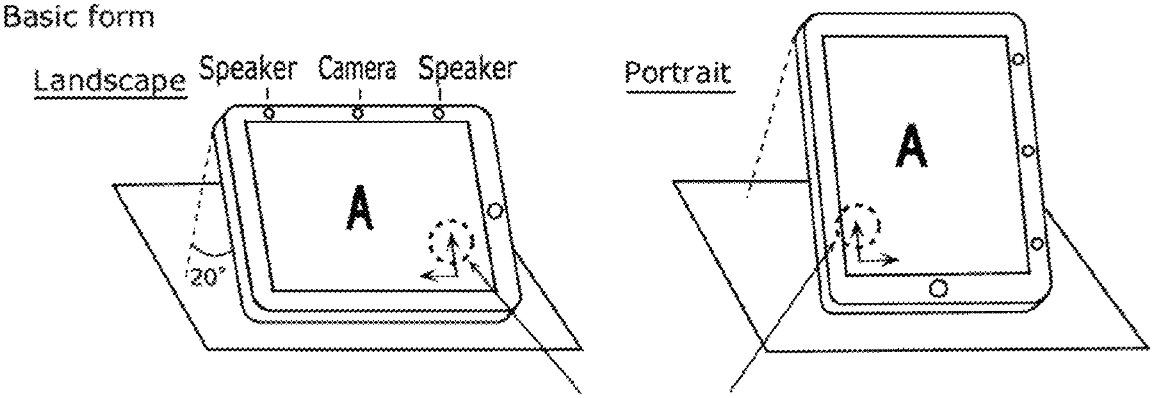
Indicate top direction (= normal position) using two arrows as one icon
(A): Letter combination readable even when changed in angle by 90°
A-1: Arrangement in different letter size
Landscape Portrait ※Letter is not easily readable at other angles

FIG. 525

Icon variations indicating two normal positions (A): Letter combination readable even when changed in angle by 90°

A-2: Arrangement of italic letter for stereoscopic effect

Landscape | Portrait | ※Letter is not easily readable at other angles

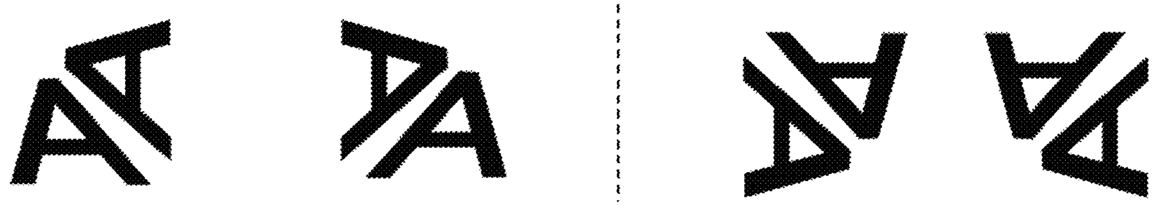

(A): Letter combination readable even when changed in angle by 90°

A-3: Arrangement in combination with graphics to enhance stereoscopic effect

Landscape | Portrait | ※Letter is not easily readable at other angles

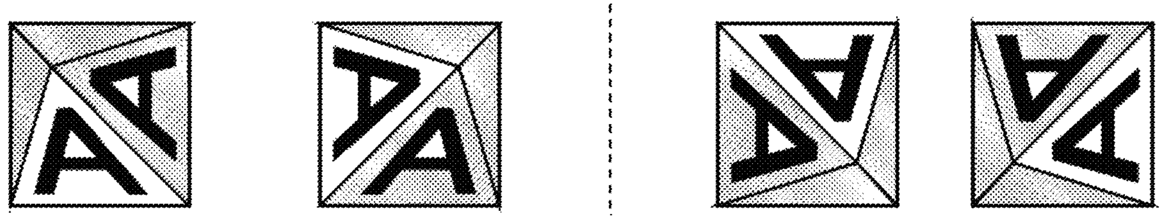

FIG. 526
Icon variations indicating two normal positions
(B): Object viewable even when changed in angle by 90°
B-1: Object representing body viewed in obliquely downward direction (e.g. person)
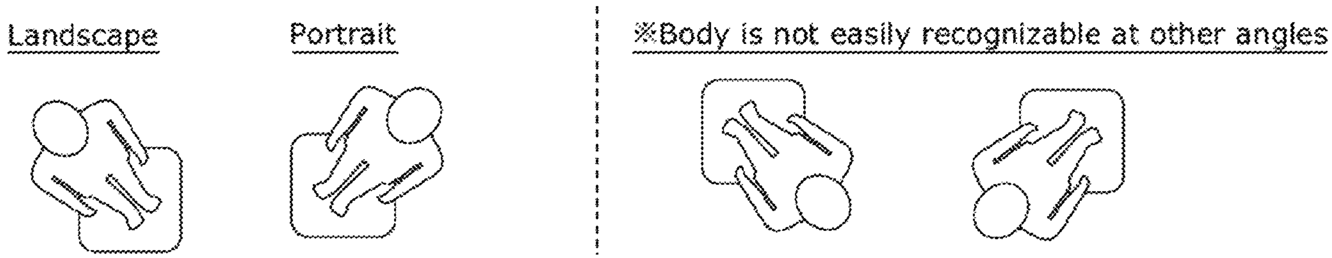
(B): Object viewable even when angle is changed by 90°
B-2: Object representing body viewed in obliquely downward direction (e.g. house)
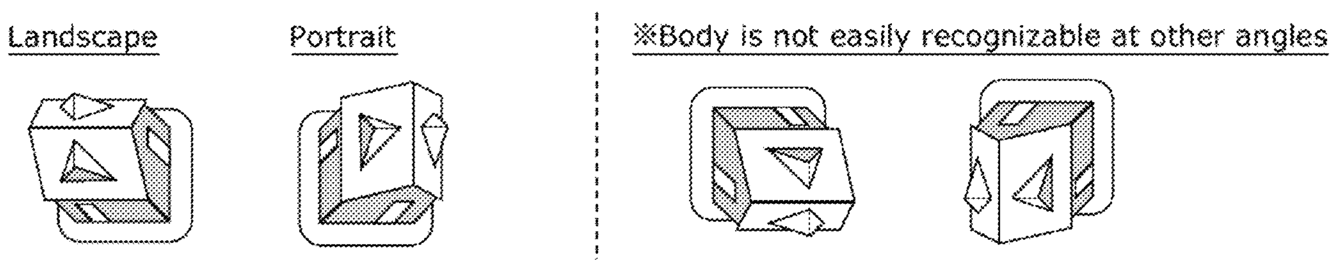

FIG. 527 Icon variations indicating two normal positions
(B): Object viewable even when changed in angle by 90°
B-3: Object representing body viewed in obliquely downward direction (e.g. staircase)
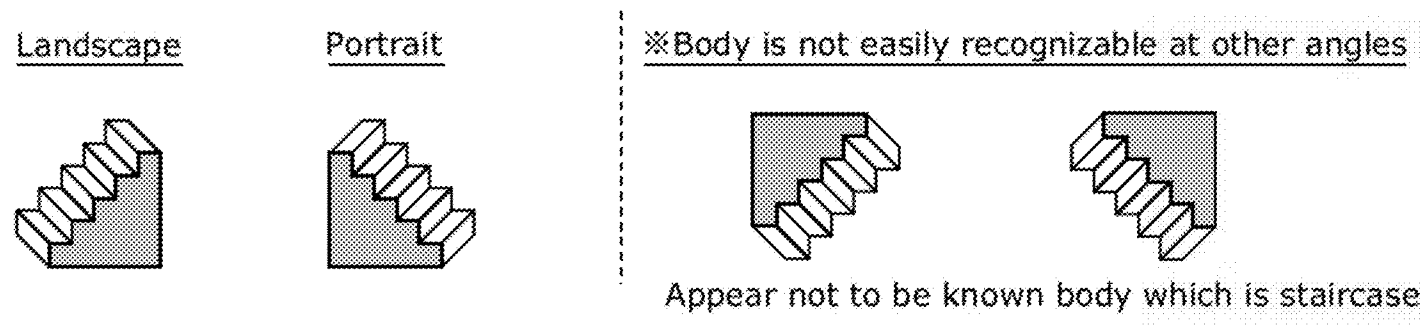
(B): Object viewable even when angle is changed by 90°
B-4: Object representing body viewed in obliquely downward direction (e.g. plate and sphere)
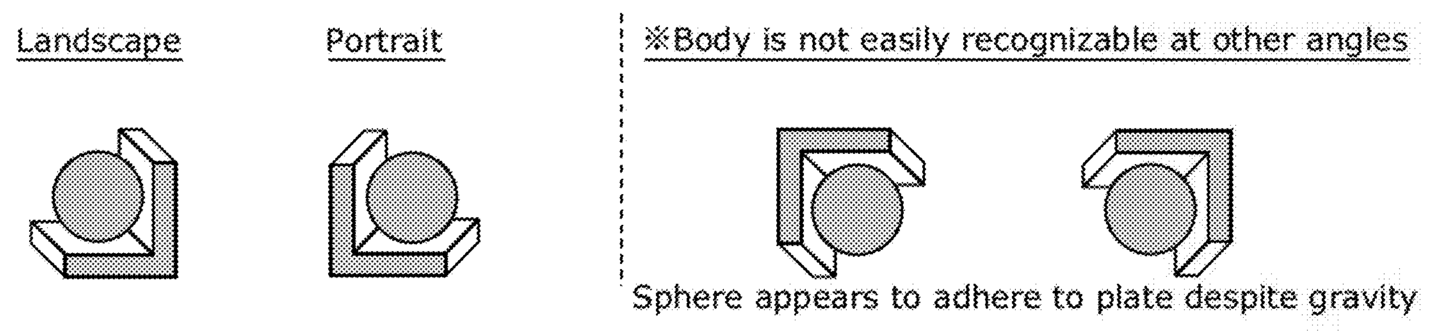

FIG. 529

Icon variations indicating two normal positions (C): Object viewable as another body when changed in angle by 90°

C-1: Picture having two meanings (e.g. bird and rabbit)

Landscape | Portrait | ※Body is not easily recognizable at other angles

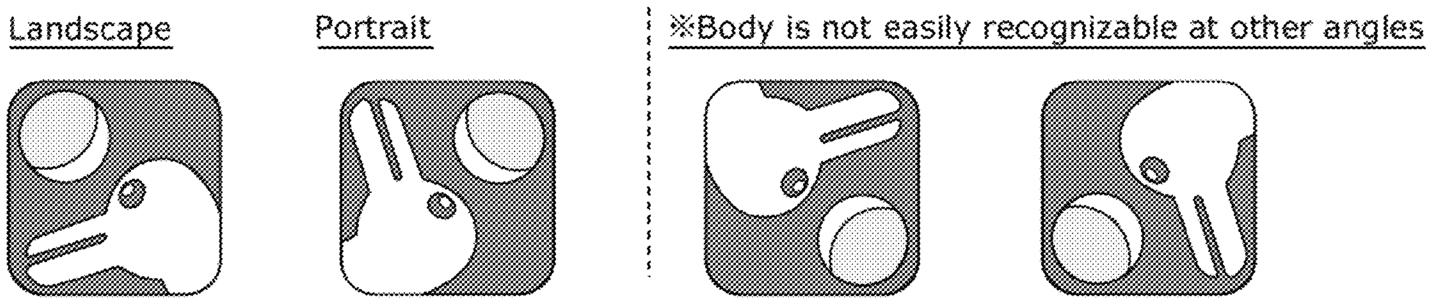

(C): Object viewable as another body when angle is changed by 90°

C-2: Picture having two meanings (e.g. penguin and sunfish)

Landscape | Portrait | ※Body is not easily recognizable at other angles

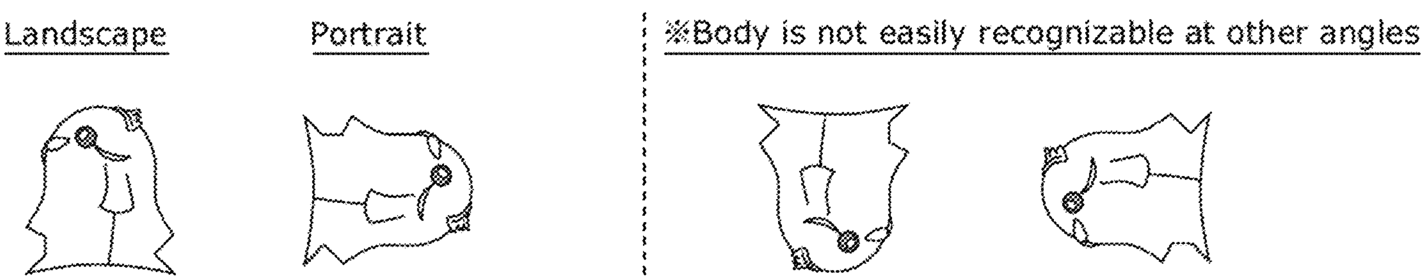

Icon variations indicating two normal positions (C): Object viewable as another body when changed in angle by 90°

C-1: Picture having two meanings (e.g. mug and overnight bag)

Landscape

Portrait

※Body is not easily recognizable at other angles

FIG. 545

| | Vertical rotation | Horizontal rotation |
|---|---|---|
| TV remote control mode | Yes | Yes |
| General-purpose remote control mode | Yes | No |

Horizontal laying detection method using magnetic sensor(S1010b)

Horizontal laying detection method using acceleration sensor(S1010b)

Display screen direction detection method(1010e)

FIG. 567

Screen display direction change table

| Rotation angle | Transition of rotation display direction |
|---|---|
| -45° ~ 45° | Advance 0 step |
| 45° ~ 135° | Advance 1 step |
| 135° ~ 225° | Advance 2 steps |
| 225° ~ 315° | Advance 3 steps |

Screen display direction transition diagram

Flow when person rotates while holding tablet

Flow when person rotates while holding tablet

| Placement information | Model pattern | Accuracy | Update time |
|---|---|---|---|
| Breast pocket | Pattern 1 | User data | 20000202:22:10:05 |
| Front pants pocket | Pattern 2 | General data | |
| Back pants pocket | Pattern 3 | User data | 20000202:22:10:05 |
| ⋮ | ⋮ | ⋮ | ⋮ |

| | | |
|---|---|---|
| Posture information | Gravity | Bottom |
| | North | Front |
| Traveling direction | | South |
| Placement information | | Breast pocket |

| Base station ID | Band | Transmitting strength | Position information | Update time |
|---|---|---|---|---|
| AP-1 | 2.4G | 15dBm | X1, Y1, Z1 | 20010202:22:10:05 |
| AP-2 | 5.0G | 10dBm | X2, Y2, Z2 | 20020303:23:13:03 |
| AP-3 | 2.4G | 10dBm | X3, Y3, Z3 | 20110924:13:51:31 |
| ⋮ | ⋮ | ⋮ | ⋮ | ⋮ |

| Base station ID | Receiving strength | Distance information |
|---|---|---|
| AP-1 | -49dBm | 5 |
| AP-2 | -60dBm | 15 |
| AP-3 | -54dBm | 10 |
| ⋮ | ⋮ | ⋮ |

| Terminal posture with respect to base station | Correction factor |
| --- | --- |
| Front | 1.0 |
| Back | 0.95 |
| Right | 0.85 |
| Left | 0.85 |
| Top | 0.75 |
| Bottom | 0.7 |

| Human body interference | Correction factor (Frequency 2.4 G) | Correction factor (Frequency 5 G) |
| --- | --- | --- |
| Yes | 0.8 | 0.7 |

| Base station ID | Provisional position information | Position information of base station | Direction of base station | Terminal posture | | Terminal posture with respect to base station |
|---|---|---|---|---|---|---|
| | | | | Gravity | North | |
| AP-1 | X4, Y4, Z4 | X1, Y1, Z1 | North | Bottom | Front | Front |
| AP-2 | | X2, Y2, Z2 | South | | | Back |
| AP-3 | | X3, Y3, Z3 | East | | | Right |
| ⋮ | | ⋮ | ⋮ | | | ⋮ |

| Base station ID | Placemen information | Traveling direction | Direction of base station | Human body interference |
|---|---|---|---|---|
| AP-1 | Breast pocket | South | North | No |
| AP-2 | | | South | Yes |
| AP-3 | | | East | No |
| ⋮ | | | ⋮ | ⋮ |

| Position | AP-1 | AP-2 | AP-3 | ⋯ |
|---|---|---|---|---|
| X5, Y5, Z5 | -49dBm | -55dBm | -59dBm | ⋯ |
| X6, Y6, Z6 | -53dBm | -54dBm | -57dBm | ⋯ |
| X7, Y7, Z7 | -59dBm | -55dBm | -51dBm | ⋯ |
| ⋮ | ⋮ | ⋮ | ⋮ | ⋯ |

| Base station ID | Bandwidth | Transmitting strength | Coordinates |
|---|---|---|---|
| AP-1 | 2.4 G | 15 dBm | X1, Y1, Z1 |
| AP-2 | 5.0 G | 10 dBm | X2, Y2, Z2 |
| AP-3 | 2.4 G | 10 dBm | X3, Y3, Z3 |
| ⋮ | ⋮ | ⋮ | ⋮ |

| Wireless station ID | Receiving strength | Estimated distance | Distance accuracy |
|---|---|---|---|
| AP-1 | -44 dBm | 3 m | 90 |
| Mobile-2 | -60 dBm | 9 m | 80 |
| TV-1 | -54 dBm | 5 m | 60 |
| ⋮ | ⋮ | ⋮ | ⋮ |

| Wireless station ID | Transmission output | Position information |
| --- | --- | --- |
| Mobile-2 | 5 dBm | — |
| TV-1 | — | X4, Y4, Z4 |
| ⋮ | ⋮ | ⋮ |

| Wireless station ID | Mobile-2 | | |
|---|---|---|---|
| Other wireless station information | Wireless station ID | Estimated distance | Distance accuracy |
| | Mobile-3 | 6 m | 75 |
| | ⋮ | ⋮ | ⋮ |

FIG.605
(a)
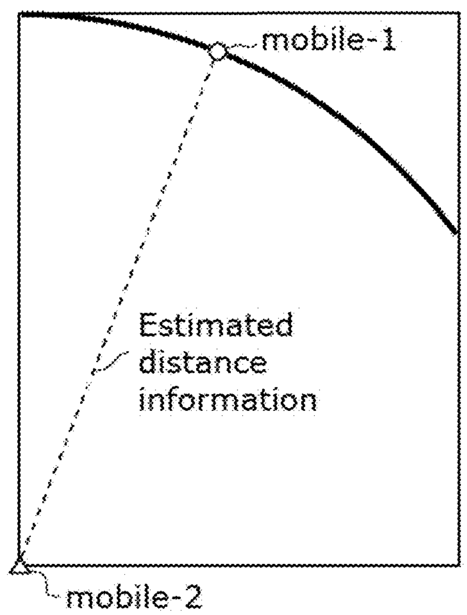
(b)
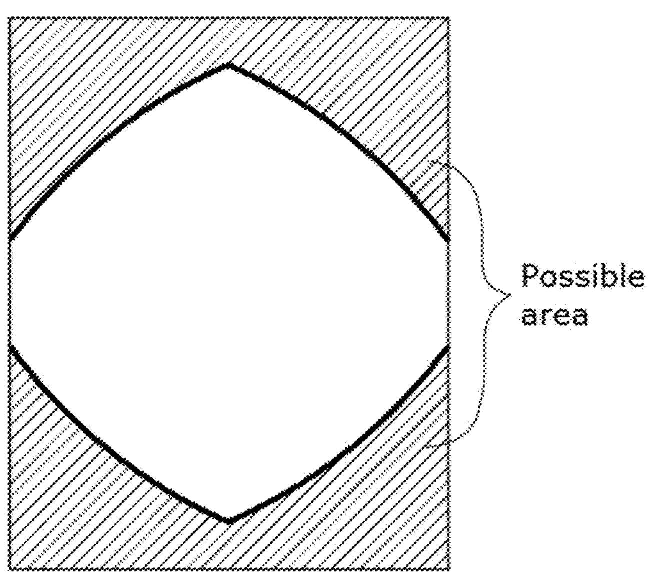

| Obstacle | Correction scaling factor |
|---|---|
| Wall (thin) | 0.9 |
| Wall (thick) | 0.8 |
| ⋮ | ⋮ |

FIG. 607
(a)
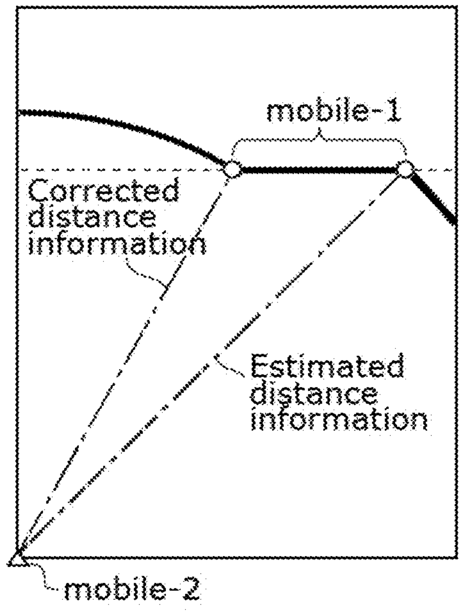
(b)
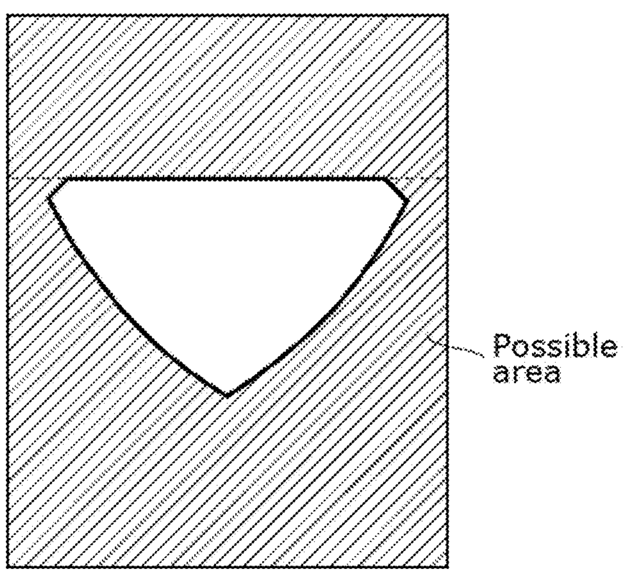

FIG. 610
(a)
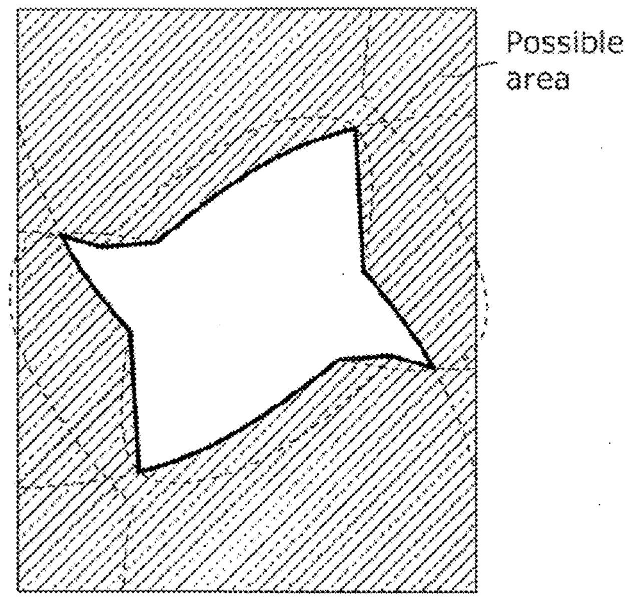
(b)
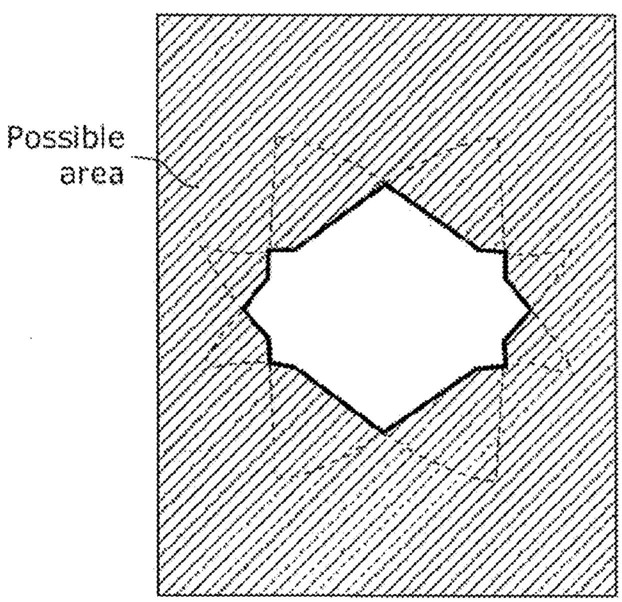

Calculate position (possible area) in which mobile terminal is likely to be present on assumption that position (X5, Y5, Z5) of pointing target pointed by user immediately before is (X2, Y2, Z2)

Background ⇒ NFC touch

Image recognition ⇒ NFC touch

Image recognition ⇒ NFC touch

FIG. 638 Image recognition ⇒ LED signal reception ⇒ NFC touch

7042

| Information held in mobile terminal | |  |
|---|---|---|
| Model number | | P909 |
| Product serial number | | 357015010738001 |
| Accuracy identifier | | Low |
| Position information | X (cm) | 4650 |
| | Y (cm) | 310 |
| | Z (cm) | 80 |
| Server specific information | URL | service.panasonic.com/nfc_service |
| | Account ID | matsushita |
| | Account PW | 12345abcd |
| | Service ID | consumerelectronics_remotocontroller |
| | Provider ID | panasonic |

| Information transmitted by home appliance | | 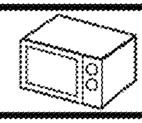 |
| --- | --- | --- |
| Application identifier | | com.panasonic.jp.consumerelectronics.homeappliance.microwave |
| Model number | | NE-A999 |
| Product serial number | | 1224185581 |
| Error code | | NO_ERROR |
| Use history | Time of last use | 200812292150 |
| | Use duration | 3618 |
| Mail address | | support_consumerelectronics_product@support.panasonic.com |
| URL | | support.panasonic.co.jp/homeappliences/support/index.html |

FIG. 645

Area list

7055

| Area identification name | Type | Belonging area | Position information | | | Depth (eD) | Width (eW) | Height (eH) |
|---|---|---|---|---|---|---|---|---|
| | | | eX | eY | eZ | | | |
| 1F | G | — | 3030 | 100 | 50 | 5050 | 2020 | 220 |
| 2F | G | — | 3150 | 100 | 300 | 4930 | 2020 | 200 |
| Kitchen | T | 1F | 3030 | 100 | 50 | 2500 | 2000 | 220 |
| Living room | T | 1F | 5530 | 1100 | 50 | 2550 | 1000 | 220 |
| Bedroom | T | 1F | 5530 | 100 | 50 | 2450 | 900 | 220 |
| : | : | : | : | : | : | : | : | : |

FIG. 646

Home appliance list held in mobile terminal

7056

| Type | Model number or Group name | Product serial number or Group name | Accuracy identifier | Position information | | | |
|---|---|---|---|---|---|---|---|
| | | | | Belonging group | X | Y | Z |
| G | Second floor home appliance | 0001 | High | — | 3150 | 1010 | 510 |
| P | Entrance light HSEW9999E | 5581553325 | High | — | 100 | 1030 | 150 |
| P | Microwave NE-A999 | 1224185581 | Low | Kitchen home appliance | 4650 | 310 | 80 |
| P | Electric kettle NC-ZZ999-W | 3764452926 | Low | Kitchen home appliance | 4750 | 360 | 80 |
| G | Kitchen home appliance | 0011 | High | First floor home appliance | 3030 | 1010 | 80 |
| ⋮ | ⋮ | ⋮ | ⋮ | ⋮ | ⋮ | ⋮ | ⋮ |

FIG. 658

Unlock table

7182

| Key function reference board ID (Product serial number) | Unlock-capable mobile terminal ID (Product serial number) | | |
|---|---|---|---|
| 0240526653 | 357015010738001 | 353001600414936 | • • • • |
| 4020436356 | 357014409191017 | | |
| ⋮ | ⋮ | | |

FIG. 667

Example of information transmitte
by optical communication

| Information type | Transmission information |
|---|---|
| Appliance ID | CC-012CF-W-012345 |
| Appliance name | Air conditioner |
| Position | (X, Y, Z) |
| Orientation | North-northeast |
| Position name | Living room |
| Error code (Message code) | U39-A、(M32-B) |
| Abbreviated ID | Y-012 |

Only appliance ID and error code or message code may be transmitted.
Abbreviated ID may be generated from appliance ID by HASH.

NFC is used for abbreviated ID and, in the case where instruction to transmit abbreviated ID instead of appliance ID is made according to presetting from mobile terminal of user, abbreviated ID is transmitted instead of appliance ID upon information transmission by optical communication.

FIG. 676

Mobile terminal initially writes:
- unique ID of mobile terminal;
- identifier for error code transmission in subsequent optical communication;
- random number; and
- current position (X, Y, Z) of mobile terminal to washlet beforehand using NFC.

* Receivable performance (e.g. 100 Hz) of mobile terminal may be written to change blinking pattern of washlet.

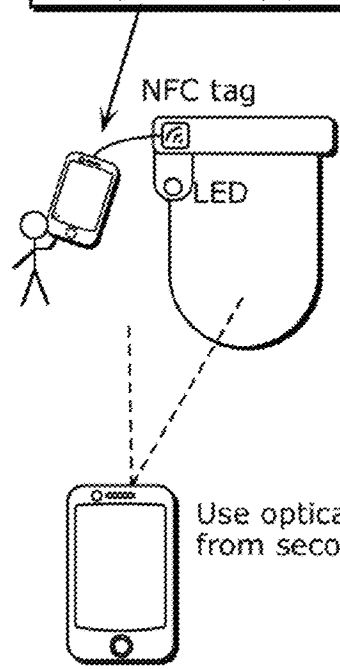

Example of information transmitted by optical communication

| | |
|---|---|
| Appliance ID | DL-E012-0123 |
| Error code | U39 |
| History information | Number of times<br>Time period<br>Power saving setting |

Transmitted in encrypted form (History information)

FIG. 679

Touch NFC tag of washlet beforehand to obtain:
- cryptography key; and
- information of washlet such as appliance ID, and
output identifier indicating support for optical communication

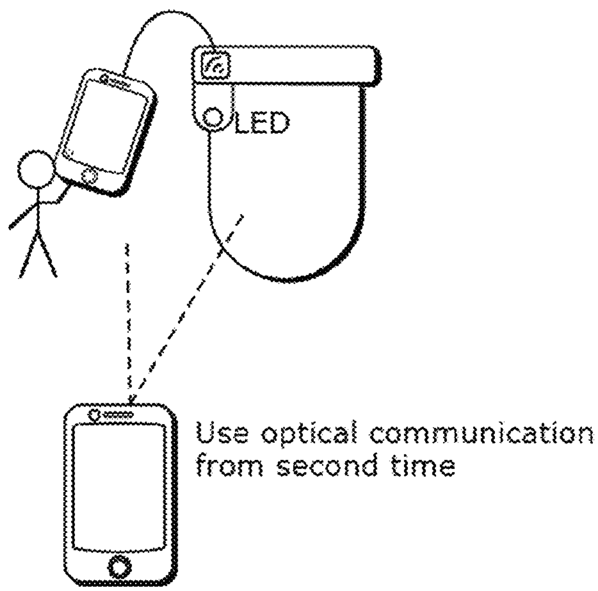

In the case where identifier indicating support for optical communication is ON, mobile terminal adds washlet to targets when narrowing down peripheral appliances capable of optical communication based on position information
In the case where identifier indicating support for optical communication is not included in information, mobile terminal inquires of server on cloud (server for managing appliance information of home appliances and the like) using appliance ID to obtain information of whether or not optical communication is supported

COMMUNICATION DEVICE

TECHNICAL FIELD

The present invention relates to communication devices, and more particularly to a communication device that uses proximity wireless communication (near field communication (NFC)) to provide an extended user interface for home appliances.

BACKGROUND ART

As a conventional communication device that uses proximity wireless communication, there is disclosed a remote controller capable of reading apparatus information from an IC tag and registering operation information corresponding to the apparatus information (for example, see Patent Literature (PTL) 1).

The disclosed remote controller includes operation units, and remotely controls a predetermined controlled apparatus. The remote controller includes: an IC tag reading unit that reads the apparatus information corresponding to the controlled apparatus from an IC tag; and a CPU that executes a registration program for registering a control information data file in which the apparatus information and control information are stored in association with each other and the apparatus information read by the IC tag reading unit, and also for obtaining the control information associated with the apparatus information from the control information data file and registering the control information in association with corresponding operation units. When an operation unit is pressed, the remote controller transmits control information corresponding to the pressed operation unit from among the registered control information, to the controlled apparatus.

There is also disclosed a remote control user interface that uses proximity wireless communication for ease and convenience of operation (for example, see PTL 2).

In the disclosed technique, a wireless tag storing information necessary for operating an external electronic apparatus is held in a region of an operation sheet segmented for different operation items. A remote controller contactlessly reads the information stored in the wireless tag, and transmits a command signal based on the read information to the electronic apparatus.

There is also disclosed a technique of selecting necessary information by a simple operation by pointing to a button to be selected on a screen (for example, see PTL 3).

The disclosed structure includes: a remote control unit that detects and measures an angle change amount between two directions when an operator holding the remote controller moves the remote controller, by an angle sensor included in the remote controller; a screen coordinate unit that calculates two-dimensional coordinates pointed by the remote control unit on a screen of a display unit, from initial coordinates and the measured angle change amount; a selected button recognition unit that determines a selected button based on the obtained two-dimensional coordinates and button position information stored in a button information storage unit; and a screen display control unit that displays buttons at corresponding positions on the screen of the display unit, and displays the selected button in a hotspot. In the case of accepting the selected button, an Enter button is pressed to transmit an accept signal.

CITATION LIST

Patent Literature

[PTL 1]
Japanese Unexamined Patent Application Publication No. 2007-134962
[PTL 2]
Japanese Unexamined Patent Application Publication No. 2004-145720
[PTL 3]
Japanese Unexamined Patent Application Publication No. 2000-270237

SUMMARY OF INVENTION

Technical Problem

However, the structure in PTL 1 has the following problem. Upon operating the controlled apparatus, the user needs to select the apparatus to be operated, via a display unit, buttons, and keys. Thus, the user needs to perform a plurality of operations on the remote control terminal when selecting the controlled apparatus.

The structure in PTL 2 has the following problem. Since an operation sheet needs to be prepared for each electronic apparatus, more operation sheets are needed as the number of electronic apparatuses which the user wants to control increases.

The structure in PTL 3 has the following problem. The remote controller transmits the angle change amount of the movement of the operator to a control device, and the control device determines the location pointed by the operator based on the angle change amount. Thus, a plurality of devices, i.e. a remote control device, a control device, and a display device, need to be provided in order to control the apparatus. Besides, PTL 3 neither discloses nor suggests a method of, in the case of operating a plurality of controlled apparatuses, registering a controlled apparatus selected by the operator and instructions to the selected controlled apparatus.

To solve the conventional problems described above, the present invention has an object of enabling a mobile device such as a mobile phone or a smartphone to easily provide an extended user interface such as universal remote control, home appliance content download, and the like, using various sensors such as an RFID, GPS, and motion sensor of the mobile device.

Solution to Problem

To achieve the stated object, a wireless communication terminal according to an aspect of the present invention includes: a position sensing unit that obtains position information of the wireless communication terminal; an apparatus information obtainment unit that obtains, from a control target apparatus which is an apparatus to be controlled by the wireless communication terminal, apparatus information for identifying the control target apparatus, by near field communication (NFC); a request generation unit that generates a request for operation information of the control target apparatus based on the apparatus information; an external communication unit that transmits the request to the control target apparatus or a server that holds the operation information, and receives the operation information; a storage unit that stores the received operation information in association with the position information obtained when performing the NFC with the control target apparatus; an operation information transmission unit that transmits the operation information to the control target apparatus; a direction sensing unit that senses direction information of a direction to which the wireless communication terminal is pointed; a directional space obtainment unit that calculates a directional space of the wireless communication terminal, based on the position information obtained by the position sensing unit and the direction information obtained by the direction sensing unit; and a selection unit that selects operation information of an apparatus present in the directional space, from position information of at least one control target apparatus assigned to operation information in the storage unit.

Thus, the communication device according to an aspect of the present invention can store position information of the communication device and operation information of an apparatus in association with each other. Moreover, a controlled apparatus can be operated merely by pointing the mobile device to the controlled apparatus, through the use of position information of the controlled apparatus.

Advantageous Effects of Invention

Thus, according to the present invention, a controlled apparatus can be operated merely by pointing the mobile device to the controlled apparatus, through the use of position information of the controlled apparatus. Furthermore, operation information of a home appliance can be easily obtained by single press of a button, using proximity wireless communication.

BRIEF DESCRIPTION OF DRAWINGS

FIG. 25 presents an example of description of the operation program for downloading image and executing slide show.

FIG. 40B is a flowchart of uploading steps in a camera according to Embodiment 2 of the present invention.

FIG. 40C is a flowchart of uploading steps in a camera according to Embodiment 2 of the present invention.

FIG. 46A is a flowchart presenting details of FIG. 45.

FIG. 46B is a flowchart presenting details of FIG. 45.

FIG. 57 is a table of a data structure of a customer attribute database.

FIG. 58 is a table of a data structure of an electronic catalog database.

FIG. 64 is a diagram illustrating examples of fixed information of a mailing object according to Embodiment 5 of the present invention.

FIG. 80 is a table of pieces of setting information registered in the server.

FIG. 81 is a table of pieces of apparatus operation information registered in the RF-ID card.

FIG. 84 is a table of apparatus operation information registered in the RF-ID card used in the recorder.

FIG. 85 is a table of apparatus operation information registered in the RF-ID card used in a vehicle navigation device.

FIG. 112 is a diagram showing a list of delay times in video passing.

FIG. 113 is a diagram for explaining a procedure of passing video being reproduced in the TV to the mobile AV terminal.

FIG. 114 is a diagram for explaining the procedure of passing video being reproduced in the TV to the mobile AV terminal.

FIG. 115 is a diagram for explaining the procedure of passing video being reproduced in the TV to the mobile AV terminal.

FIG. 116 is a diagram for explaining the procedure of passing video being reproduced in the TV to the mobile AV terminal.

FIG. 117 is a diagram for explaining the procedure of passing video being reproduced in the TV to the mobile AV terminal.

FIG. 118 is a diagram for explaining the procedure of passing video being reproduced in the TV to the mobile AV terminal.

FIG. 119 is a diagram for explaining a procedure of passing video being reproduced in the mobile AV terminal to the TV.

FIG. 120 is a diagram for explaining the procedure of passing video being reproduced in the mobile AV terminal to the TV.

FIG. 121 is a diagram for explaining the procedure of passing video being reproduced in the mobile AV terminal to the TV.

FIG. 122 is a schematic diagram showing data exchange between mobile AV terminals using NFC.

FIG. 123 is a sequence diagram showing data exchange between mobile AV terminals using NFC or high-speed wireless communication.

Figure 124:
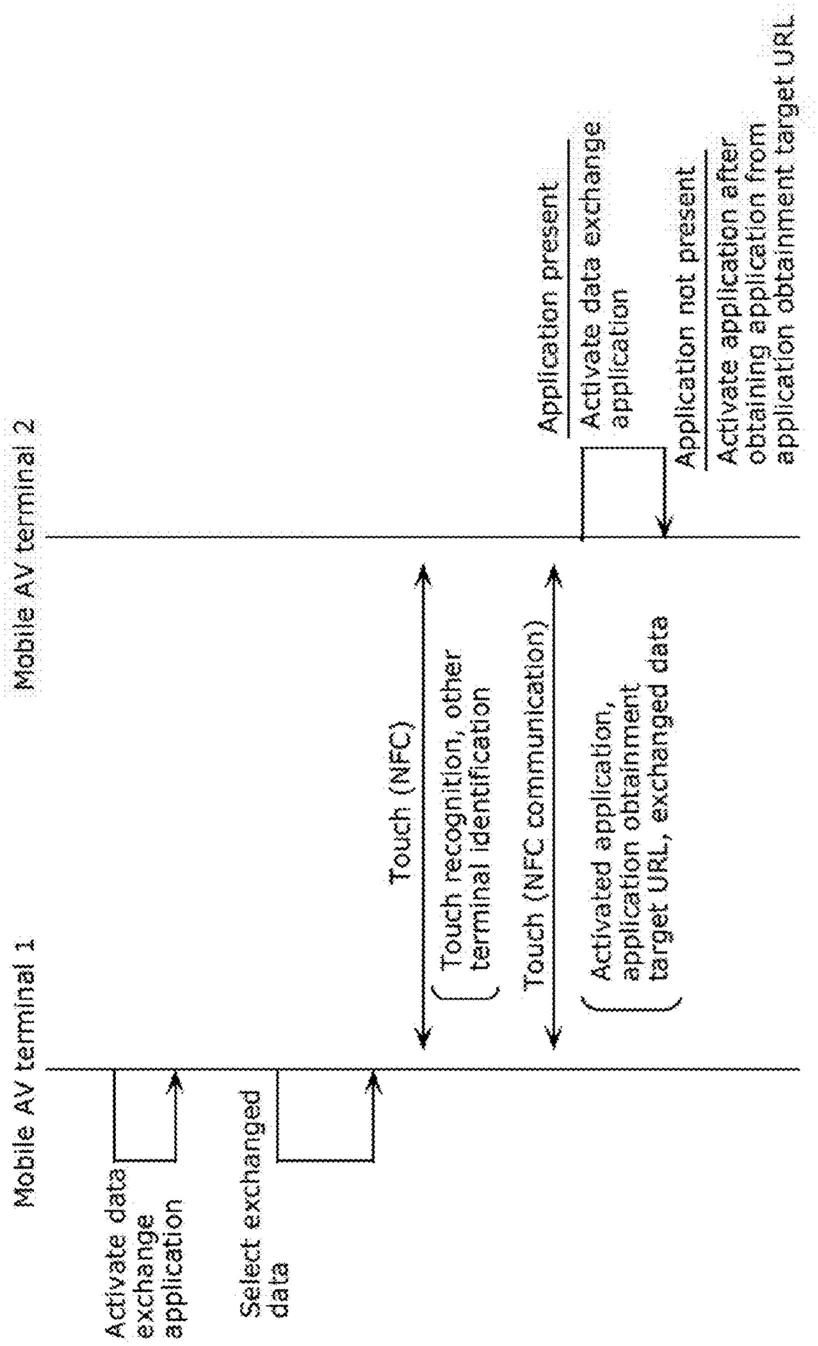

FIG. 124 is a sequence diagram showing the data exchange between the mobile AV terminals using NFC or high-speed wireless communication.

Figure 125:
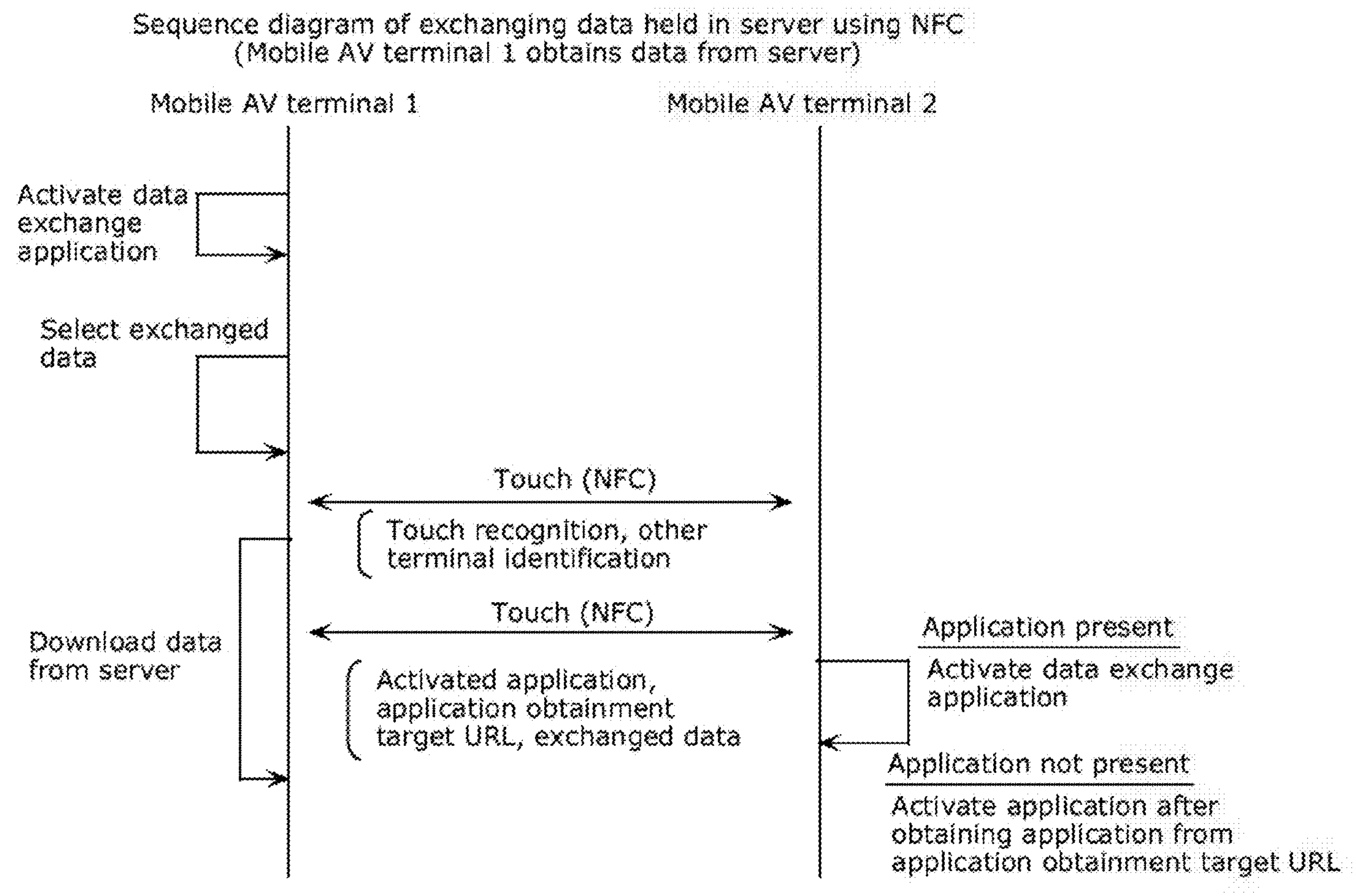

FIG. 125 is a sequence diagram showing the data exchange between the mobile AV terminals using NFC or high-speed wireless communication.

Figure 126:
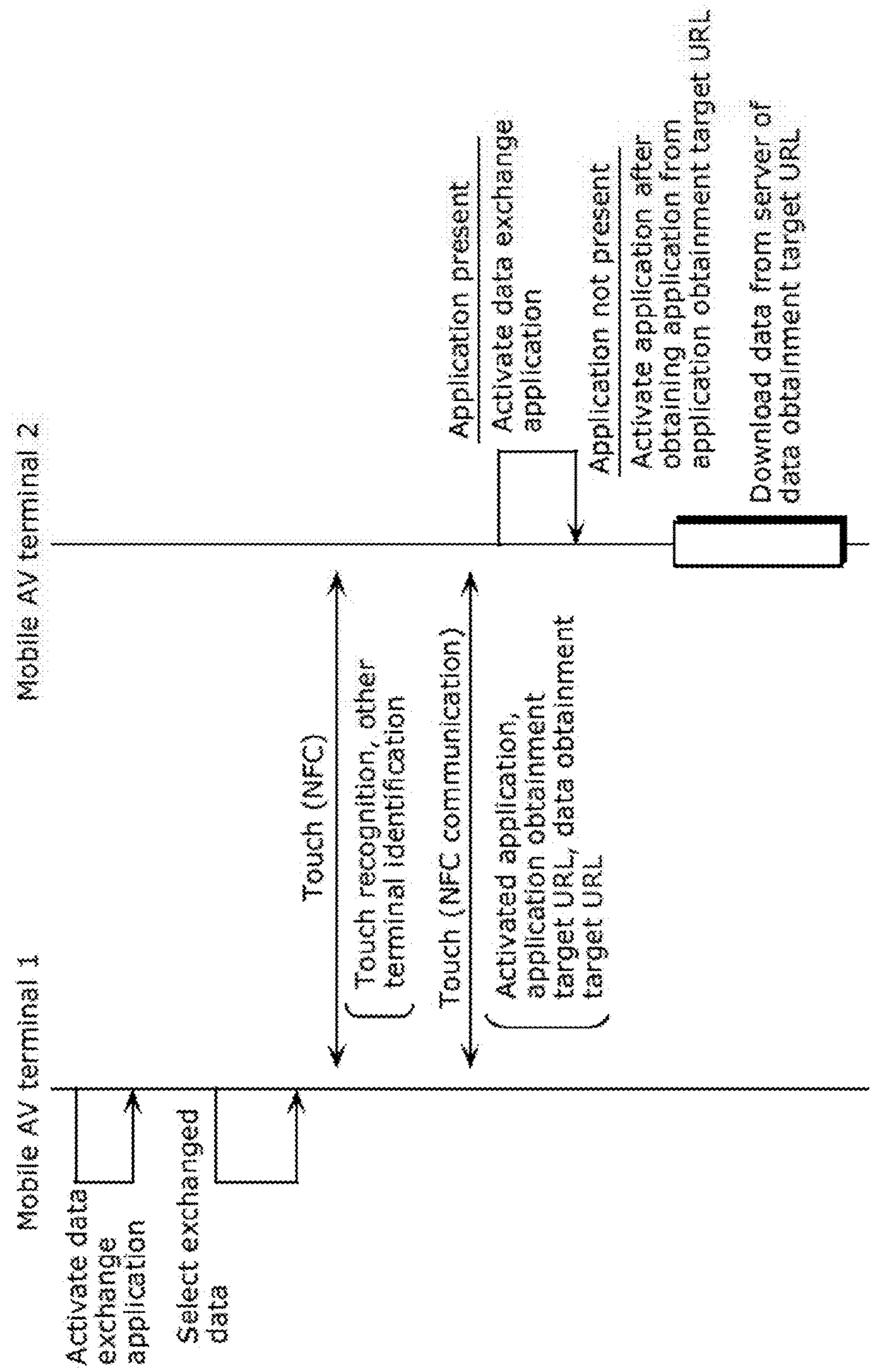

FIG. 126 is a sequence diagram showing the data exchange between the mobile AV terminals using NFC or high-speed wireless communication.

Figure 127:
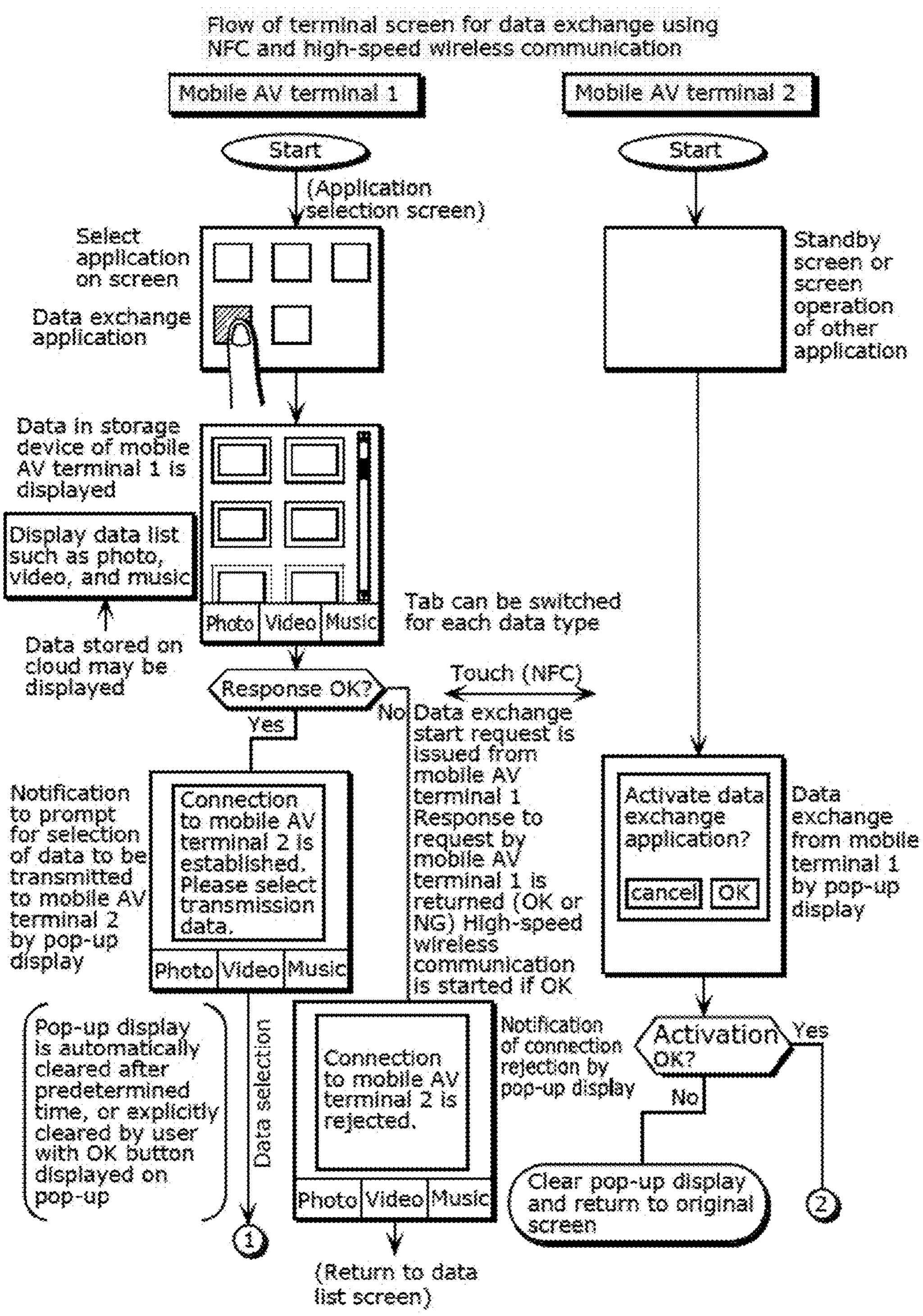

FIG. 127 is a terminal screen flow diagram when exchanging data using NFC and high-speed wireless communication.

Figure 128:
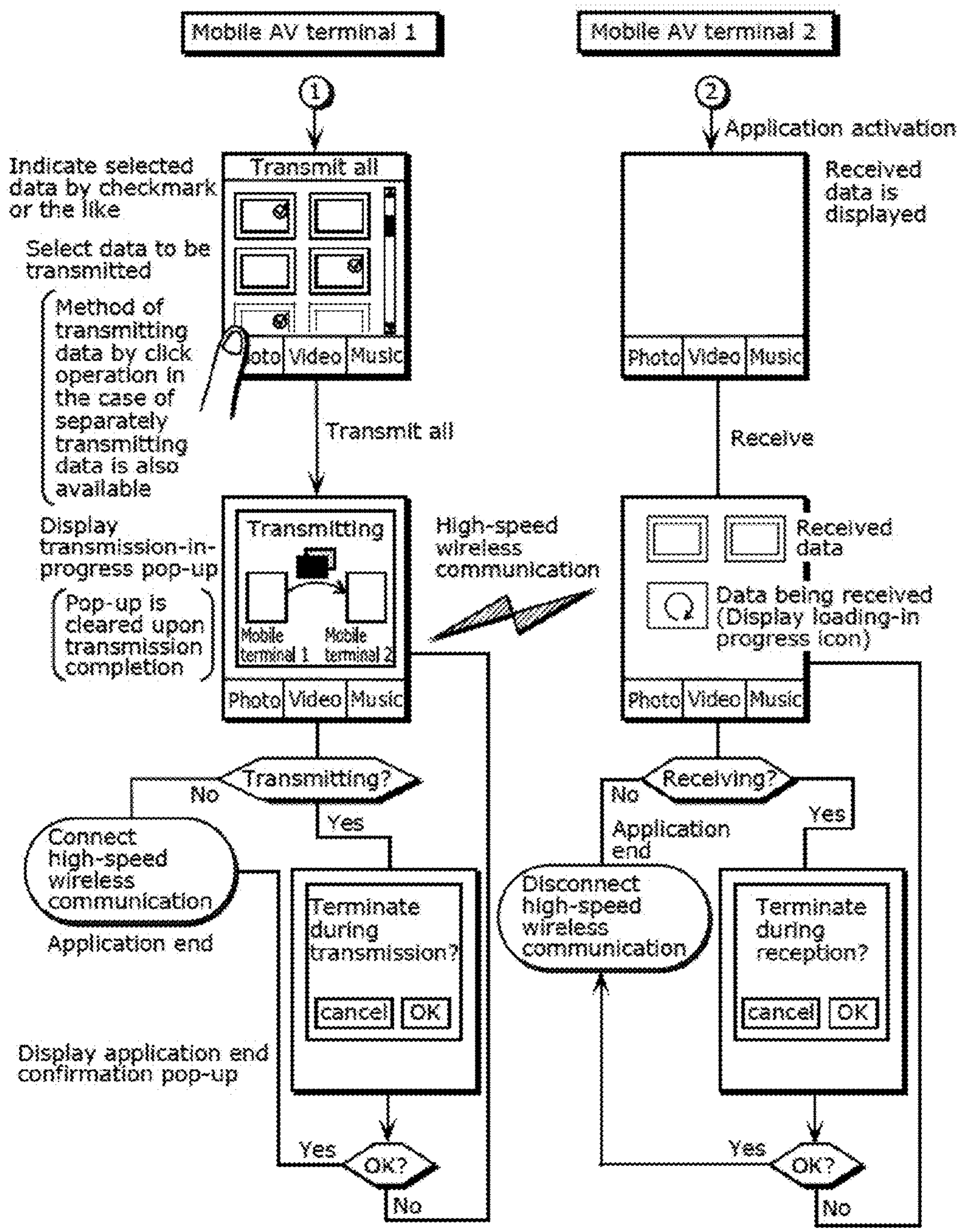

FIG. 128 is a terminal screen flow diagram when exchanging data using NFC and high-speed wireless communication.

Figure 129:
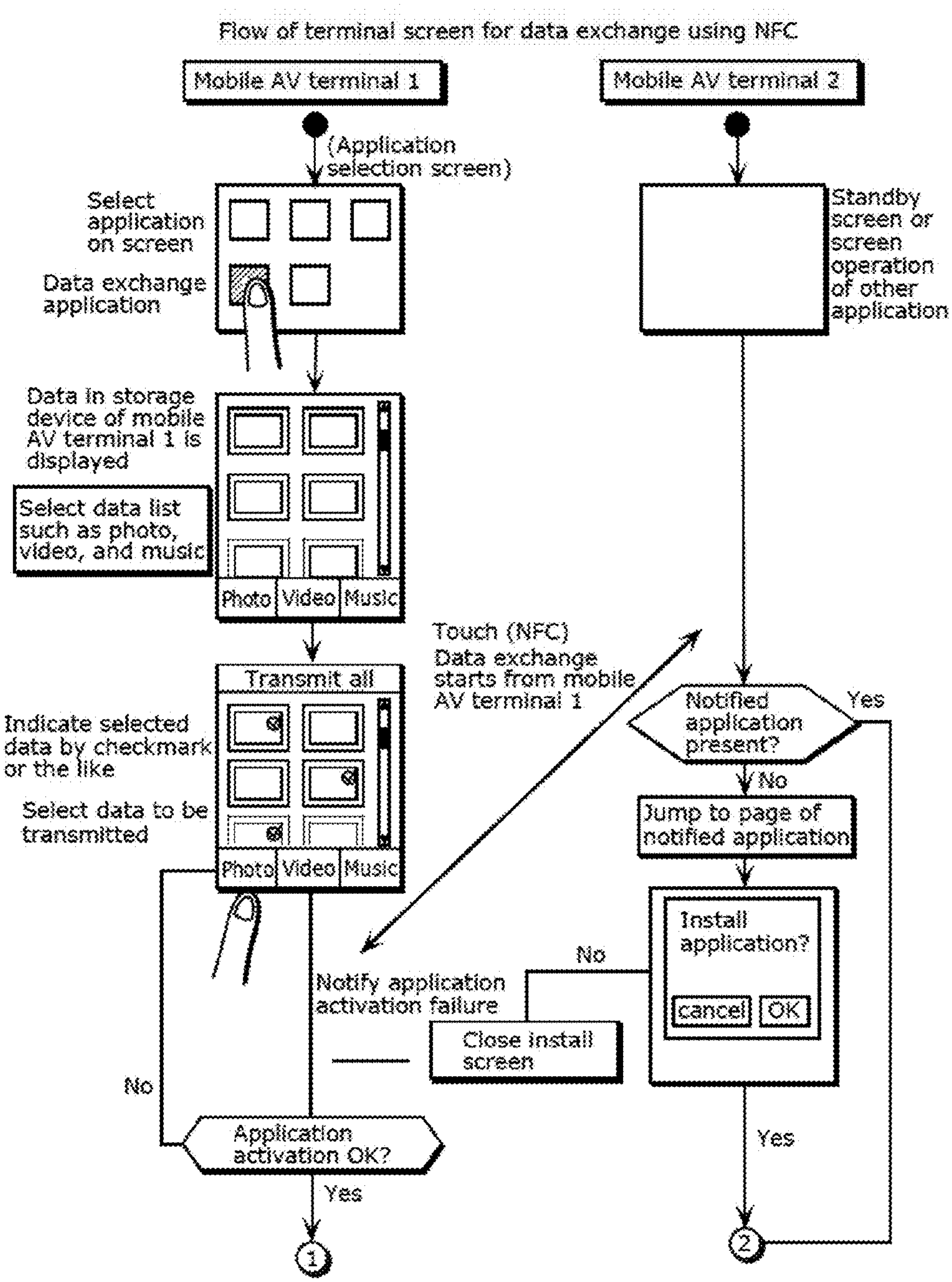

FIG. 129 is a terminal screen flow diagram when exchanging data using NFC.

Figure 130:
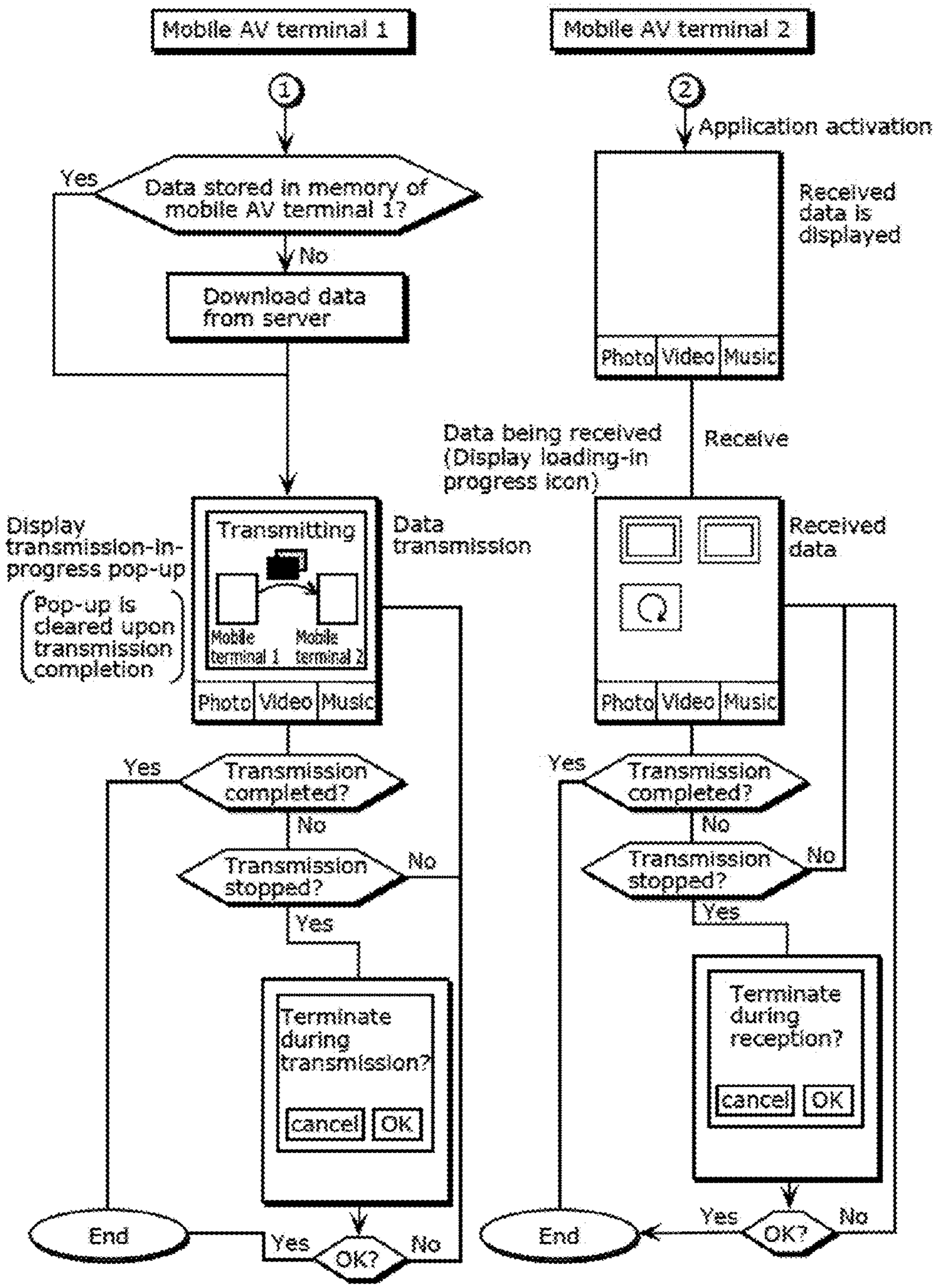

FIG. 130 is a terminal screen flow diagram when exchanging data using NFC.

Figure 131:
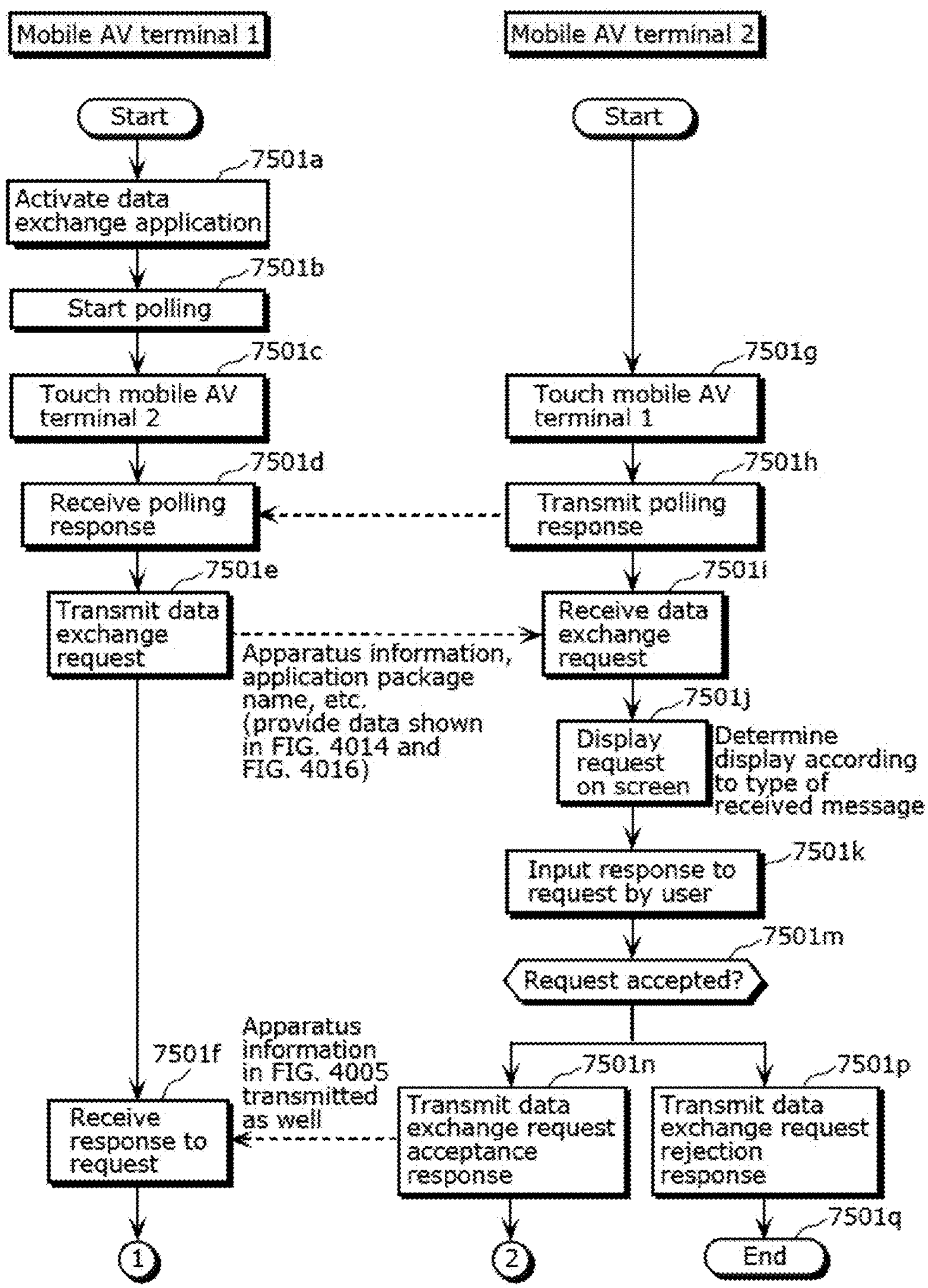

FIG. 131 is a diagram for explaining a procedure of data exchange between mobile AV terminals.

Figure 132:
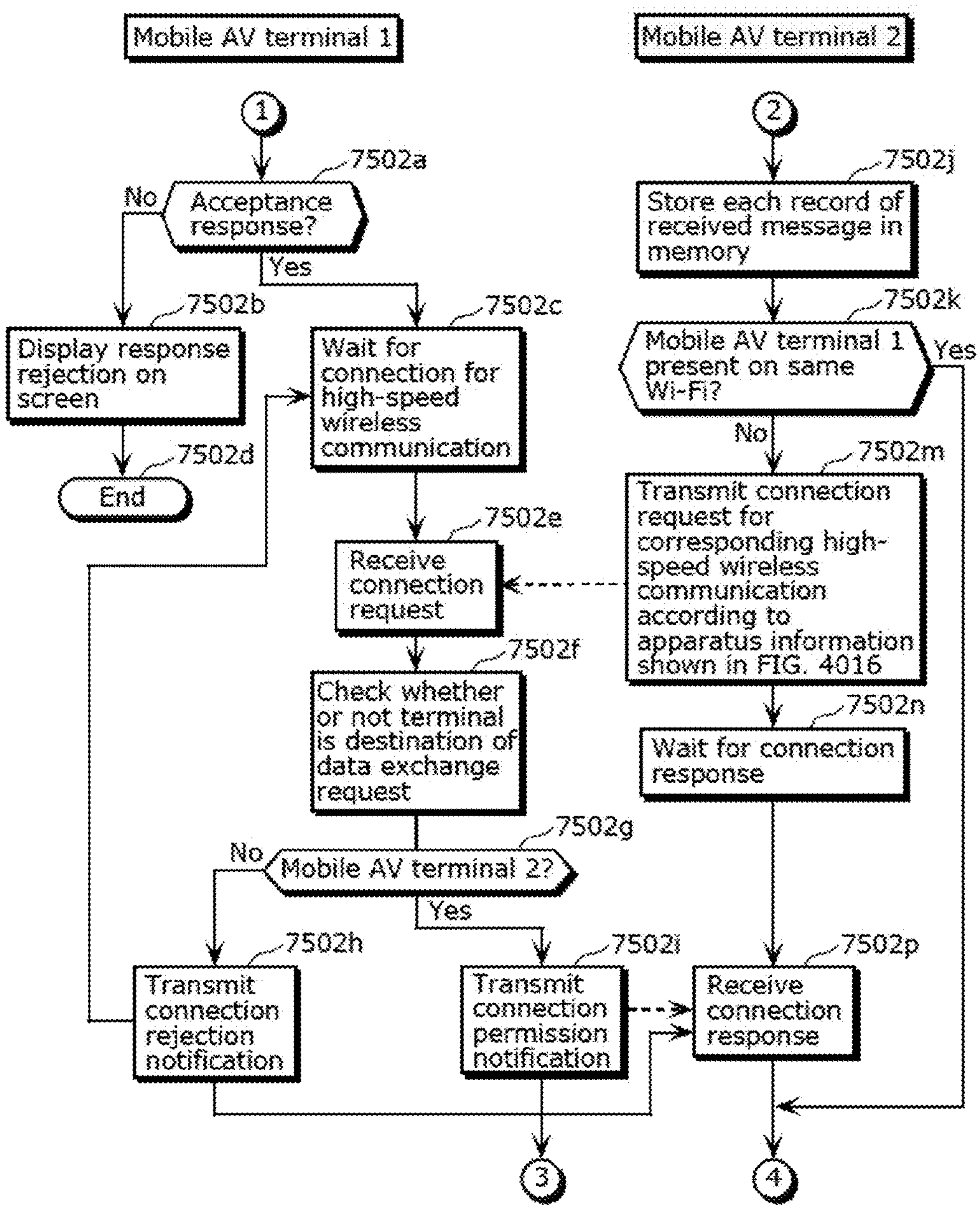

FIG. 132 is a diagram for explaining the procedure of data exchange between the mobile AV terminals.

Figure 133:
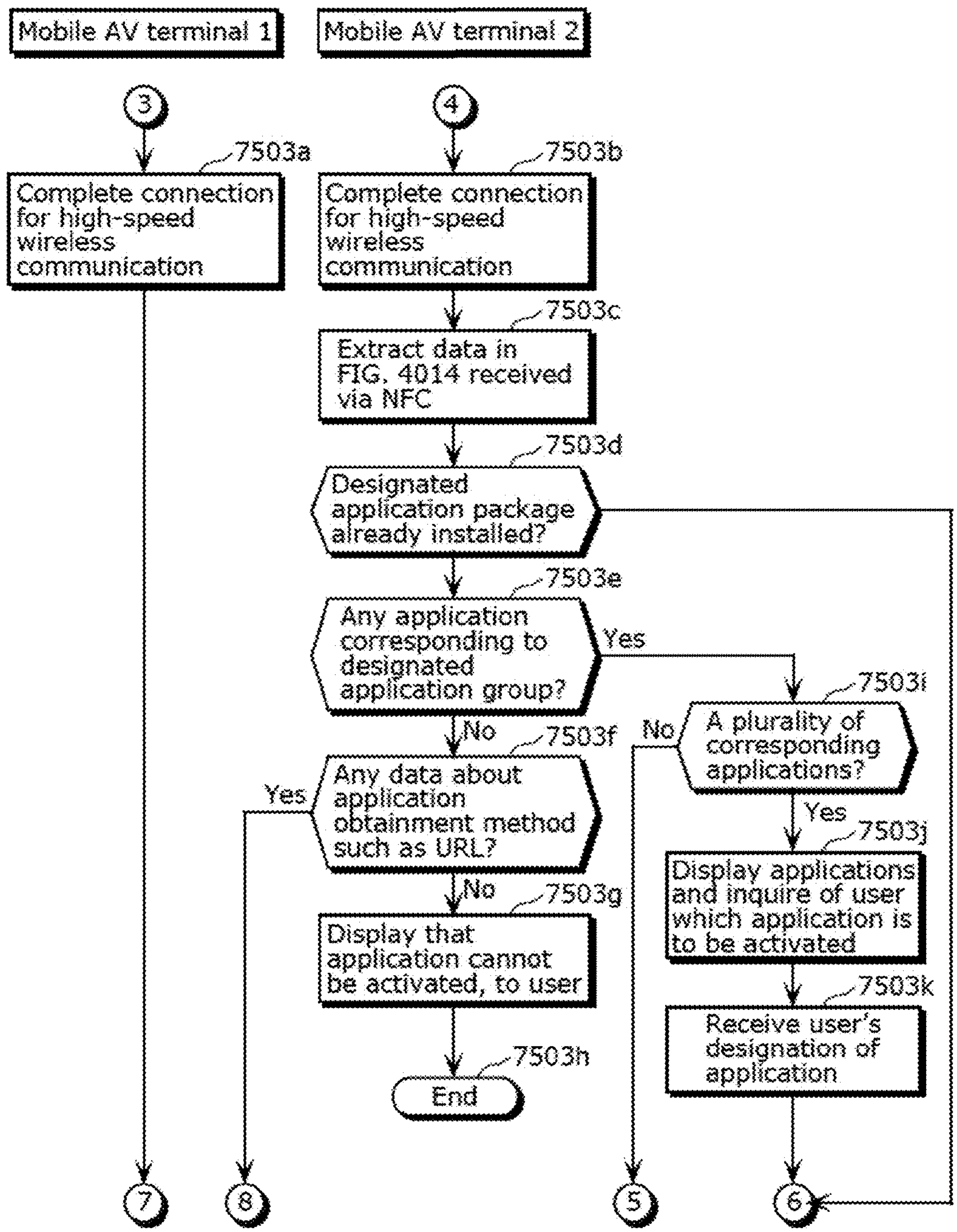

FIG. 133 is a diagram for explaining the procedure of data exchange between the mobile AV terminals.

Figure 134:
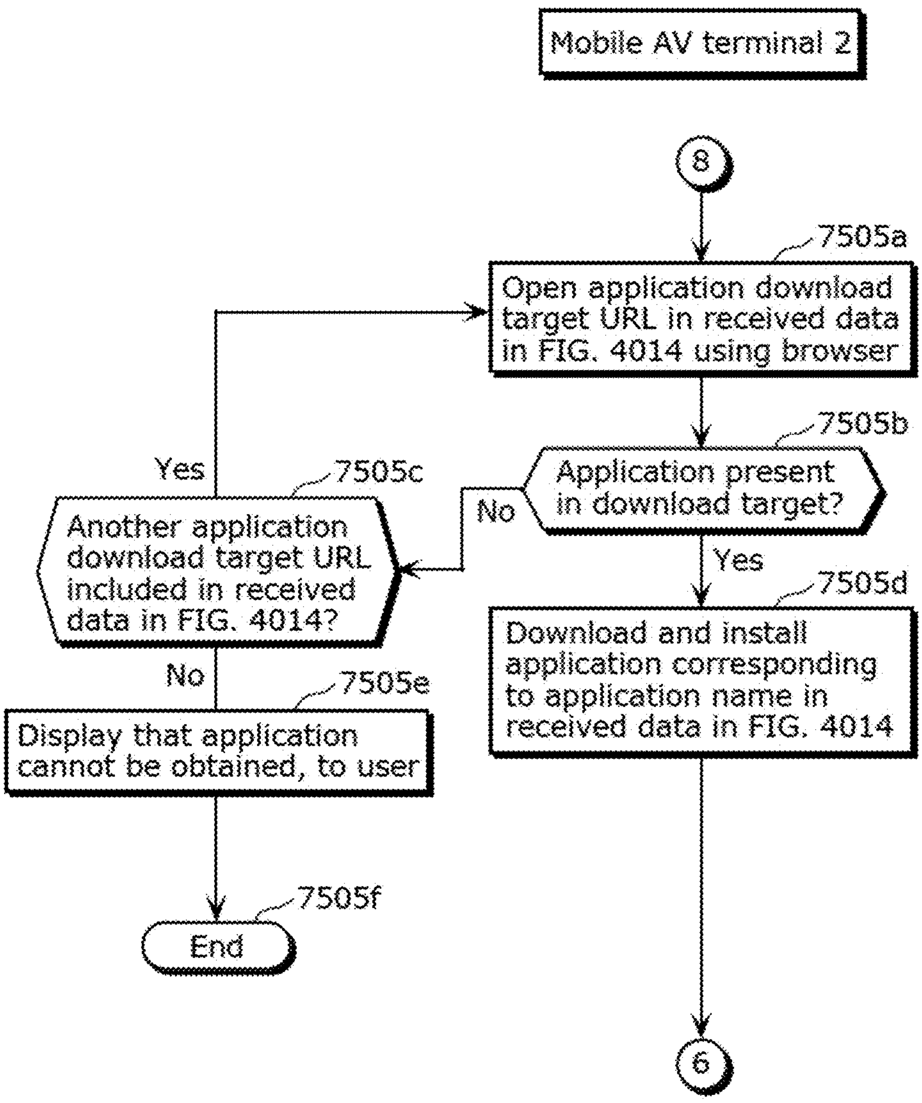

FIG. 134 is a diagram for explaining the procedure of data exchange between the mobile AV terminals.

Figure 135:
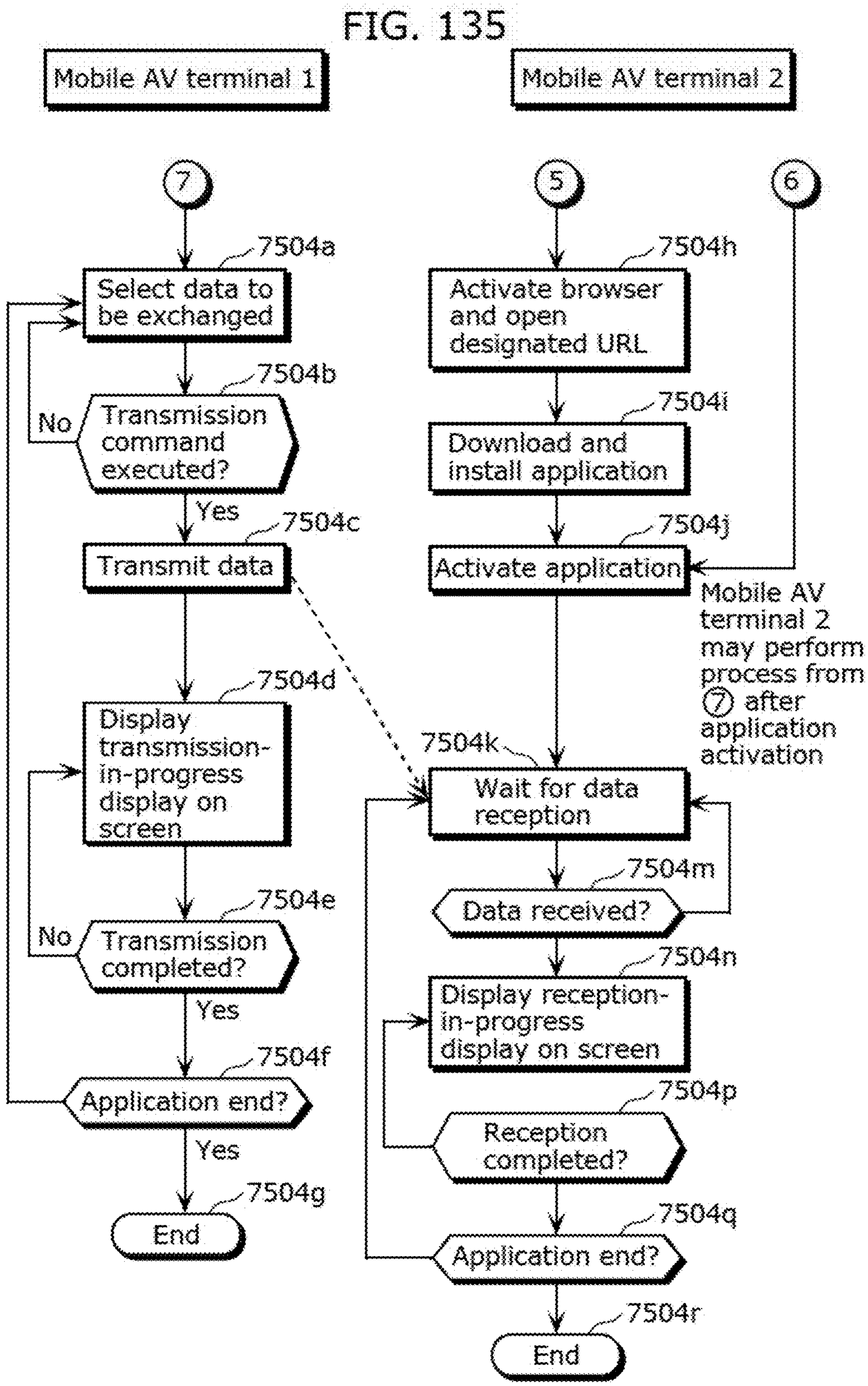

FIG. 135 is a diagram for explaining the procedure of data exchange between the mobile AV terminals.

Figure 136:
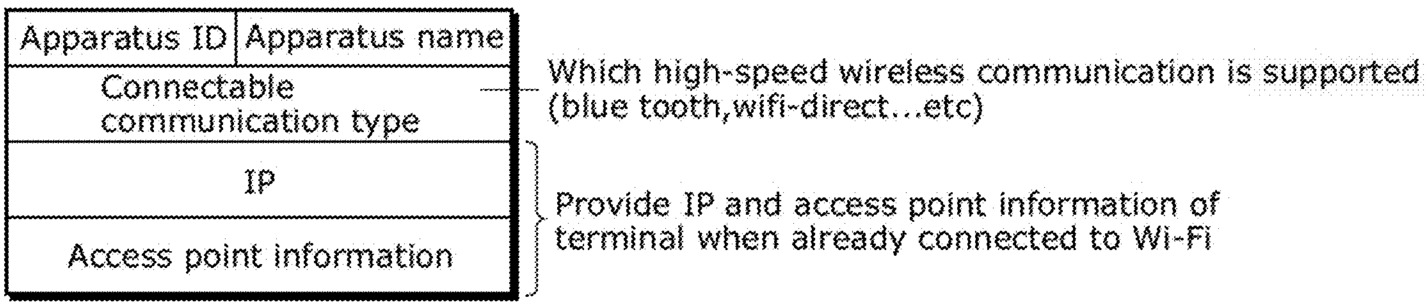

FIG. 136 is a diagram for explaining the procedure of data exchange between the mobile AV terminals.

Figure 137:
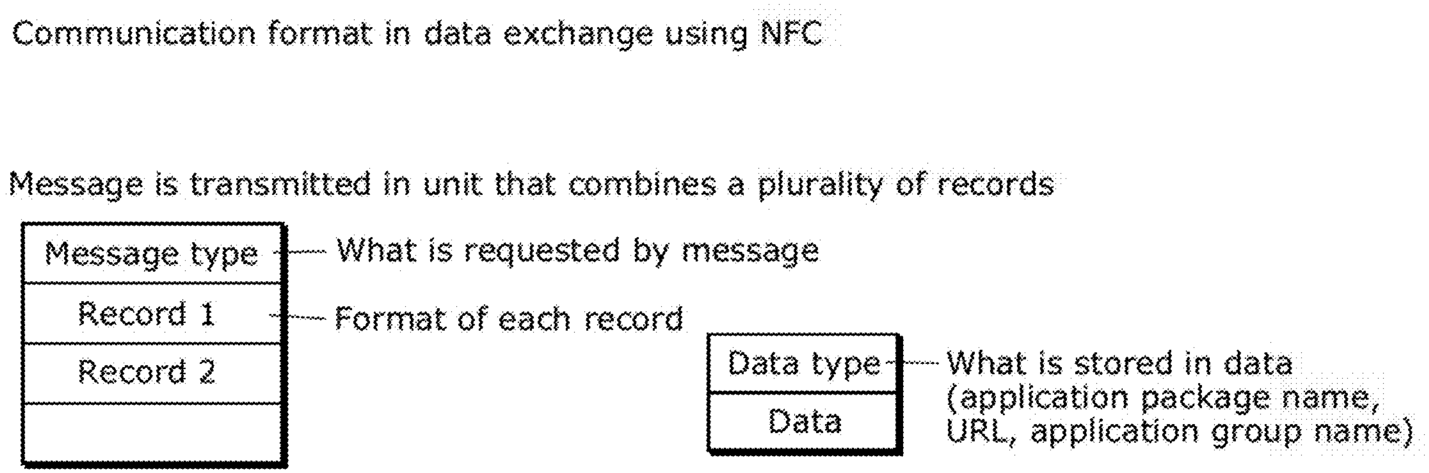

FIG. 137 is a diagram showing a communication format in data exchange using NFC shown in FIGS. 138A and 138B.

FIG. 138A is a diagram for explaining a procedure of data exchange between mobile AV terminals.

FIG. 138B is a diagram for explaining the procedure of data exchange between the mobile AV terminals.

Figure 139:
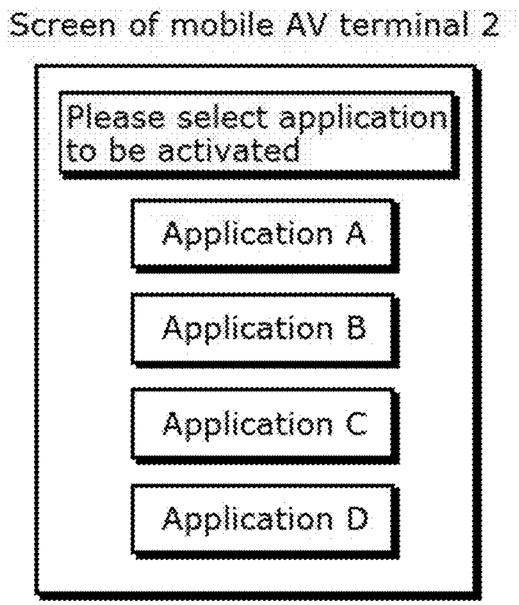

FIG. 139 is a diagram showing a screen of a mobile AV terminal 2.

Figure 140:
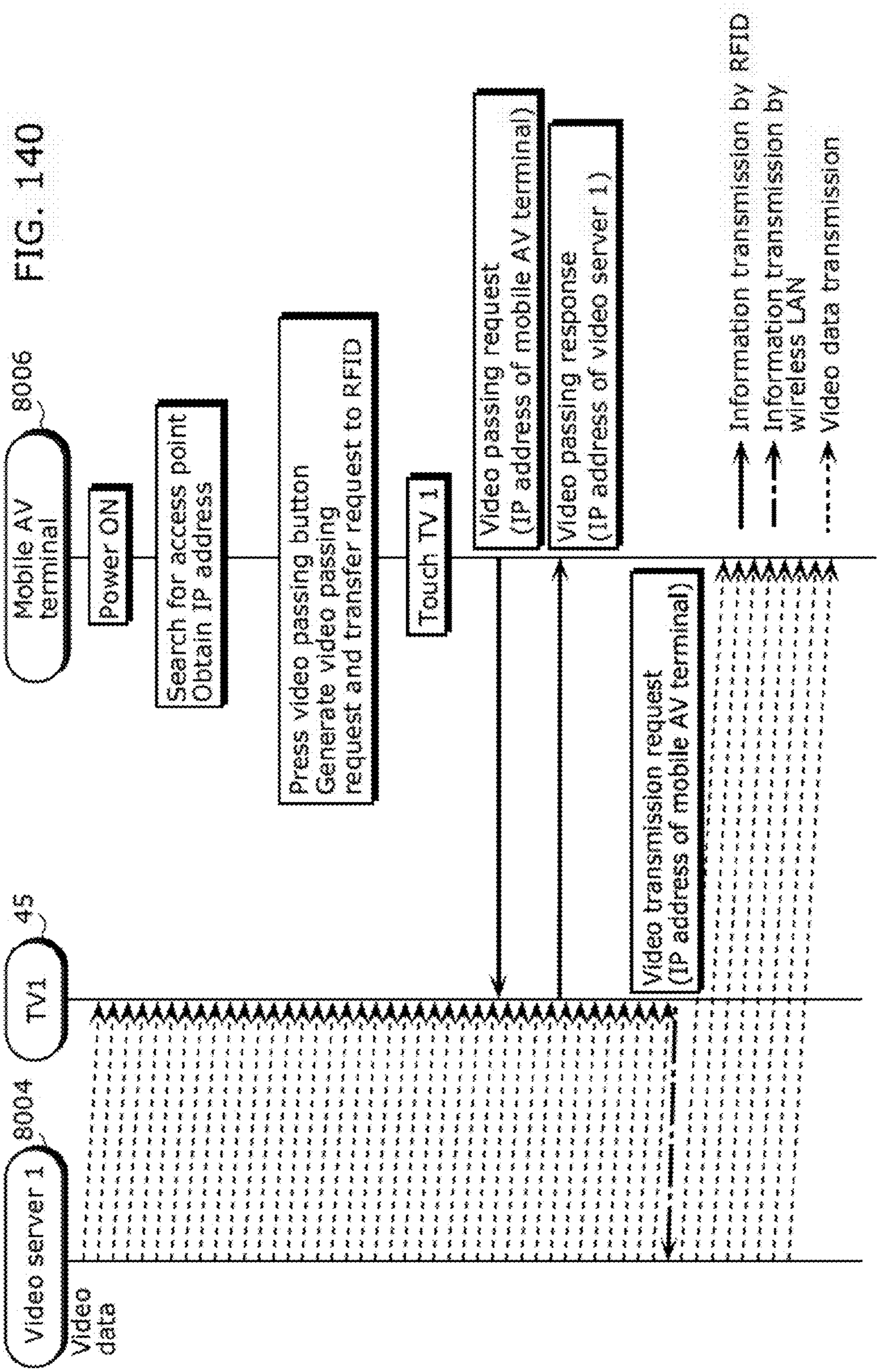

FIG. 140 is a sequence diagram in the case where the mobile AV terminal gets video (first half, control performed by give side).

Figure 141:
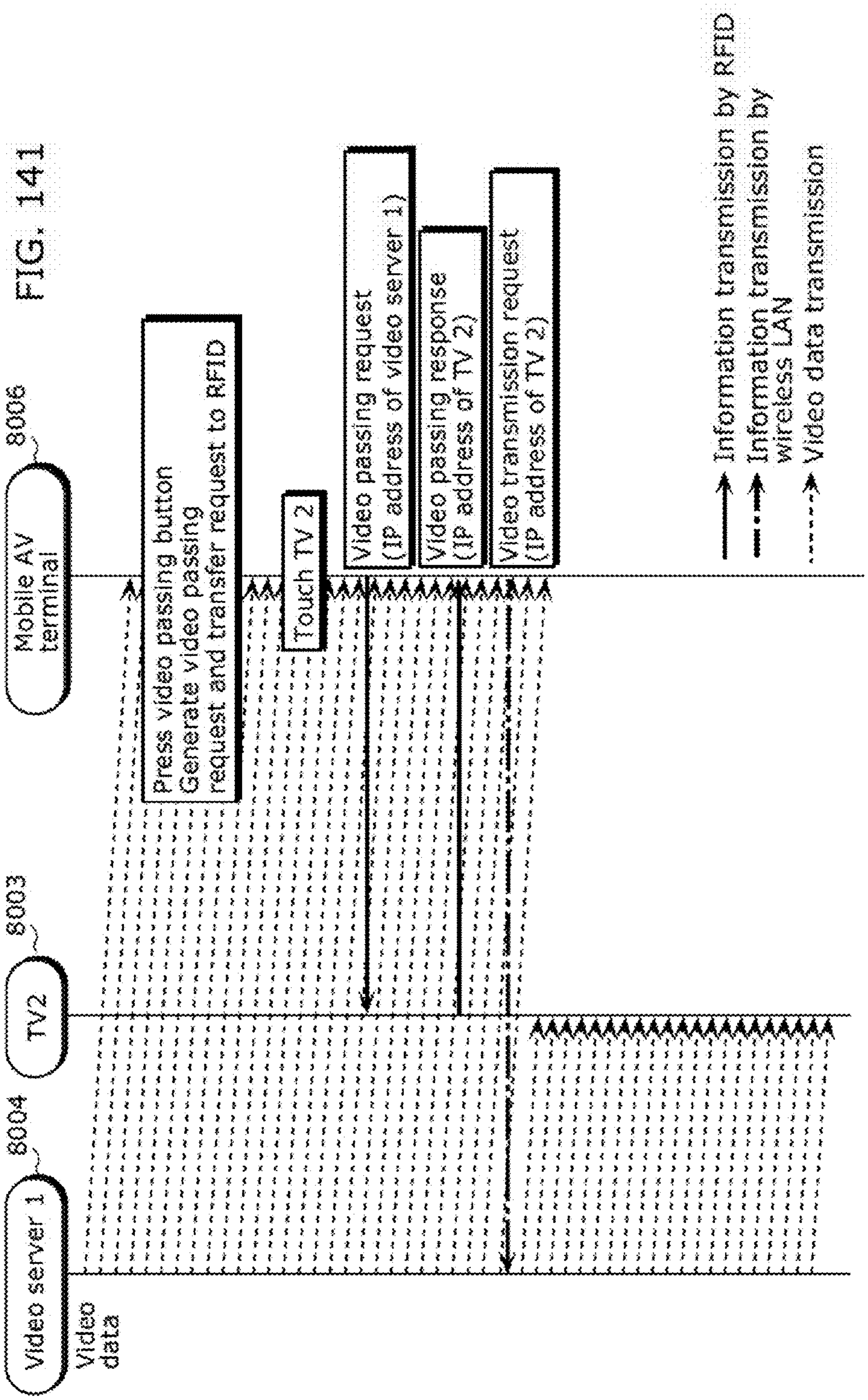

FIG. 141 is a sequence diagram in the case where the mobile AV terminal gives video (second half, control performed by give side)

Figure 142:
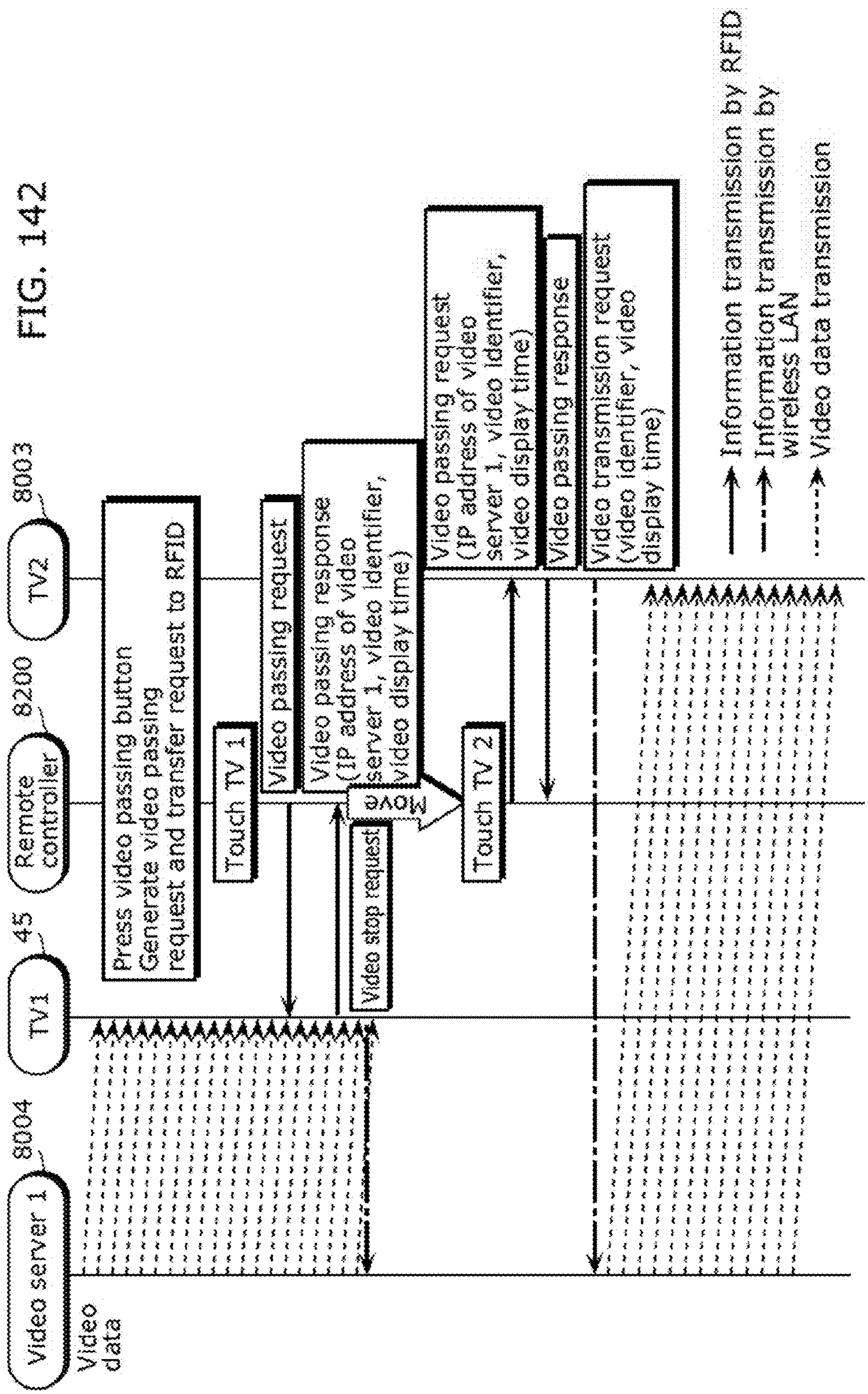

FIG. 142 is a sequence diagram in the case where passing is performed by a remote controller.

Figure 143:
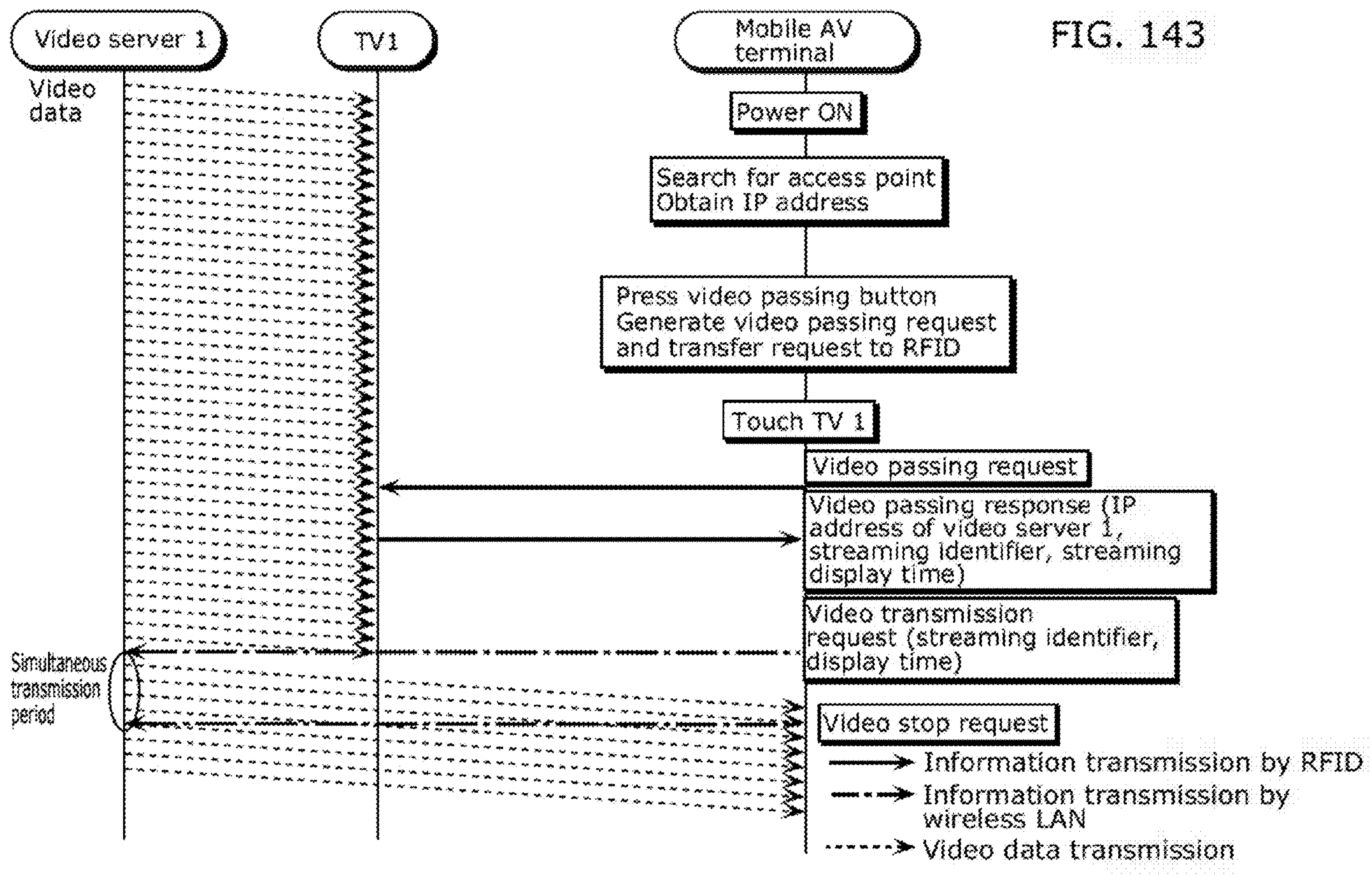

FIG. 143 is a sequence diagram in the case where a video server performs synchronous transmission.

Figure 144:
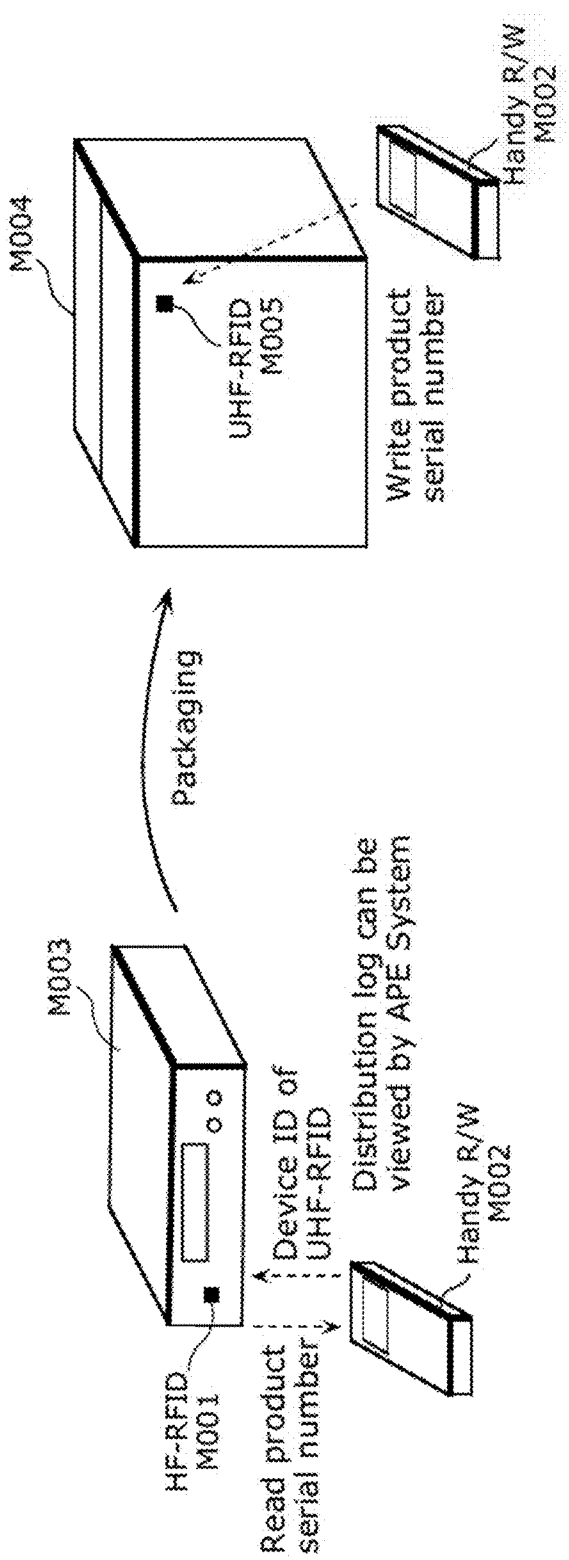

FIG. 144 is a schematic diagram illustrating processing of HF-RFID and UHF-RFID upon apparatus factory shipment.

Figure 145:
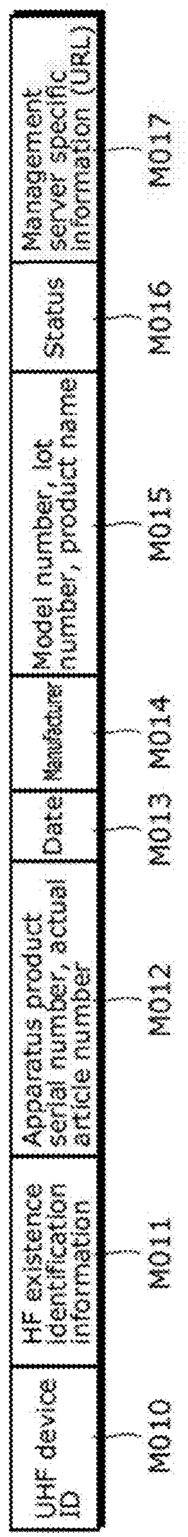

FIG. 145 is a schematic diagram illustrating a recording format of a memory accessible from a UHF-RFID tag M005.

Figure 146:
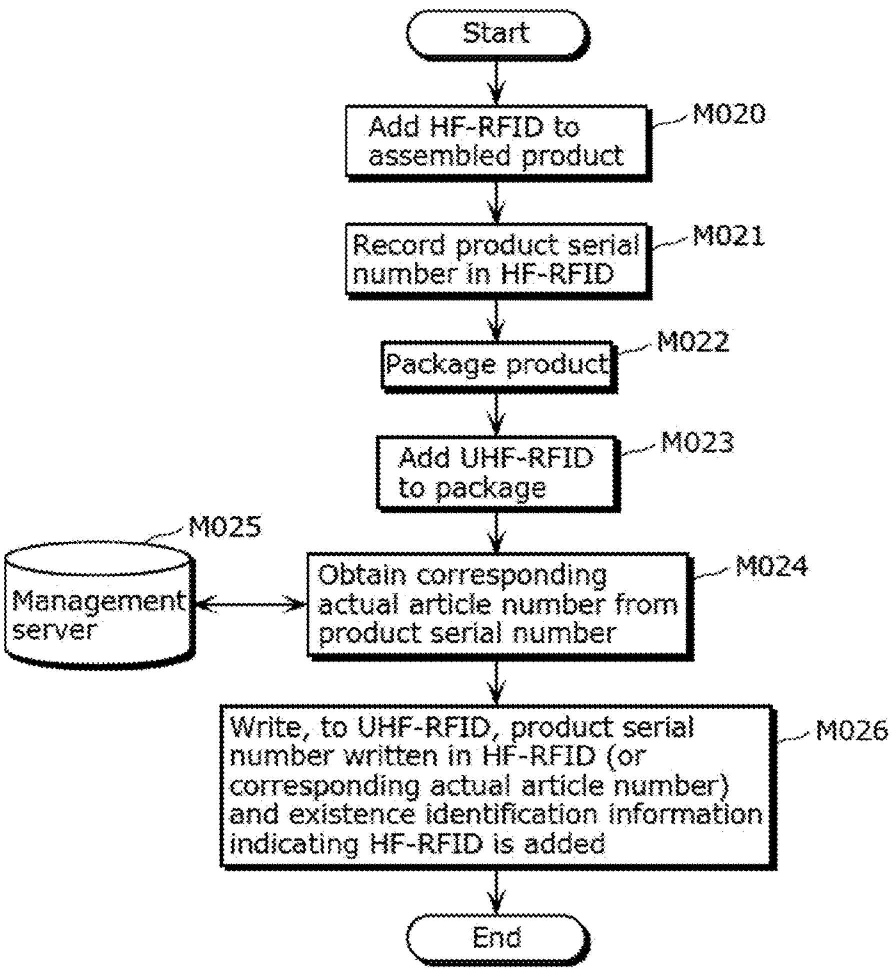

FIG. 146 is a flowchart of a flow of processing of copying a product serial number and the like from HF-RFID to UHF-RFID upon factory shipment of an apparatus M003.

Figure 147:
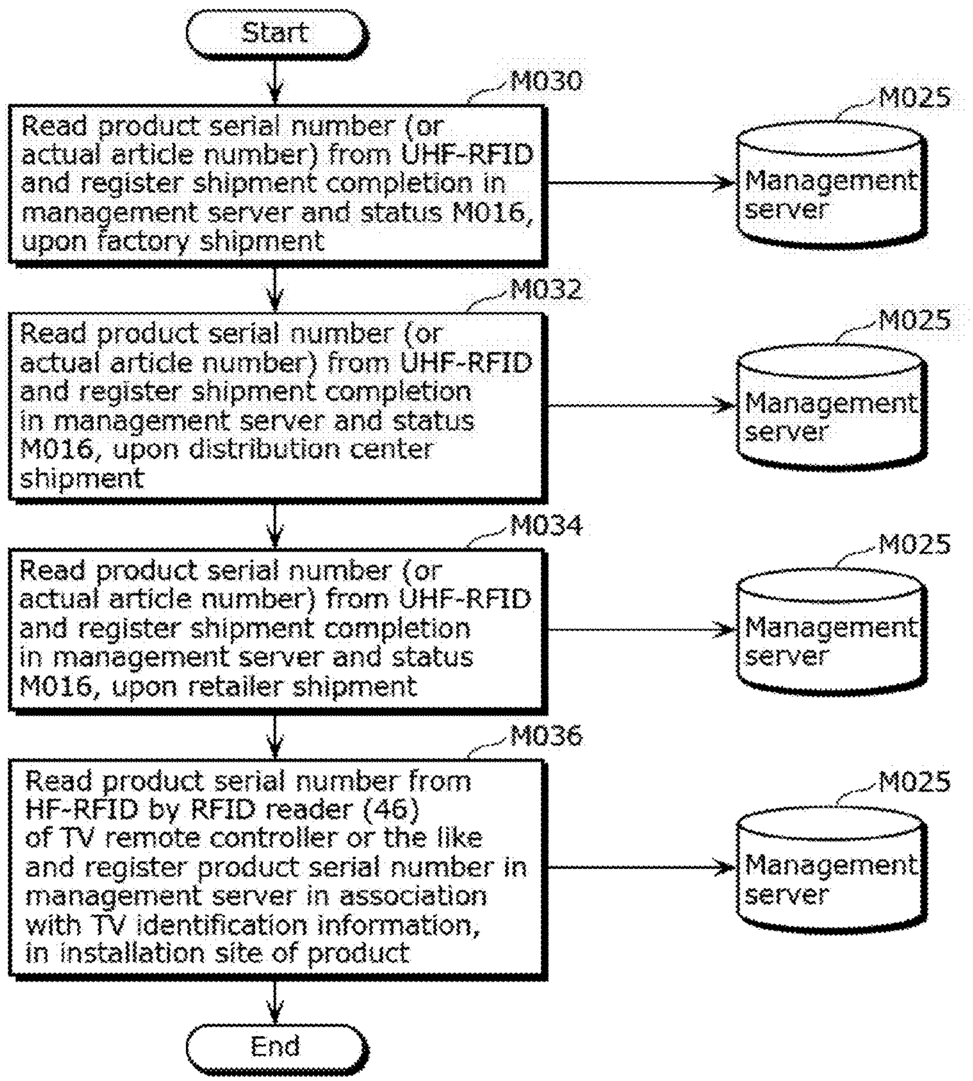

FIG. 147 is a flowchart of a flow of processing in a distribution process of the apparatus M003.

Figure 148:
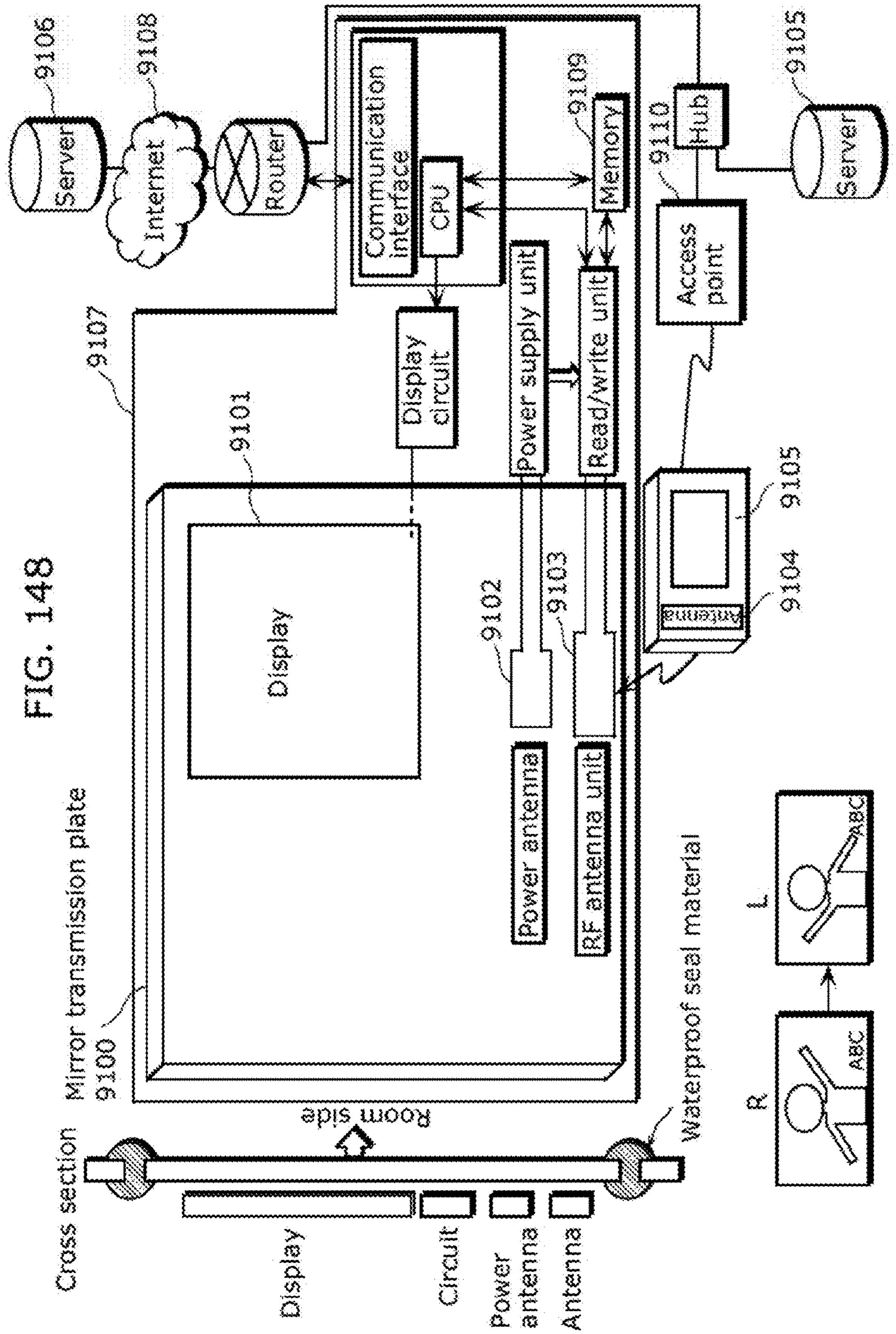

FIG. 148 is a block diagram according to Embodiment 13 of the present invention.

Figure 149:
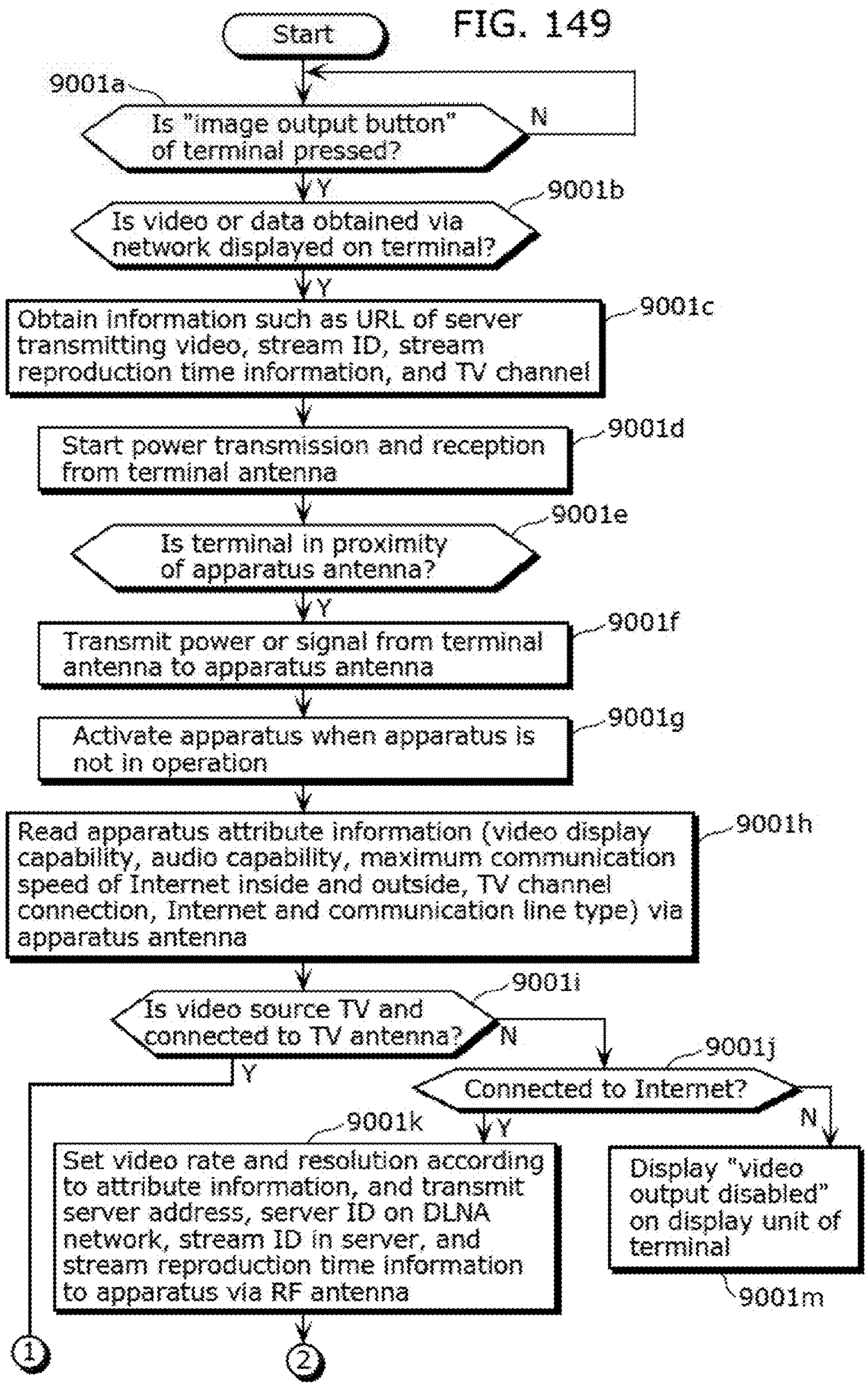

FIG. 149 is a flowchart according to Embodiment 13 of the present invention.

Figure 150:
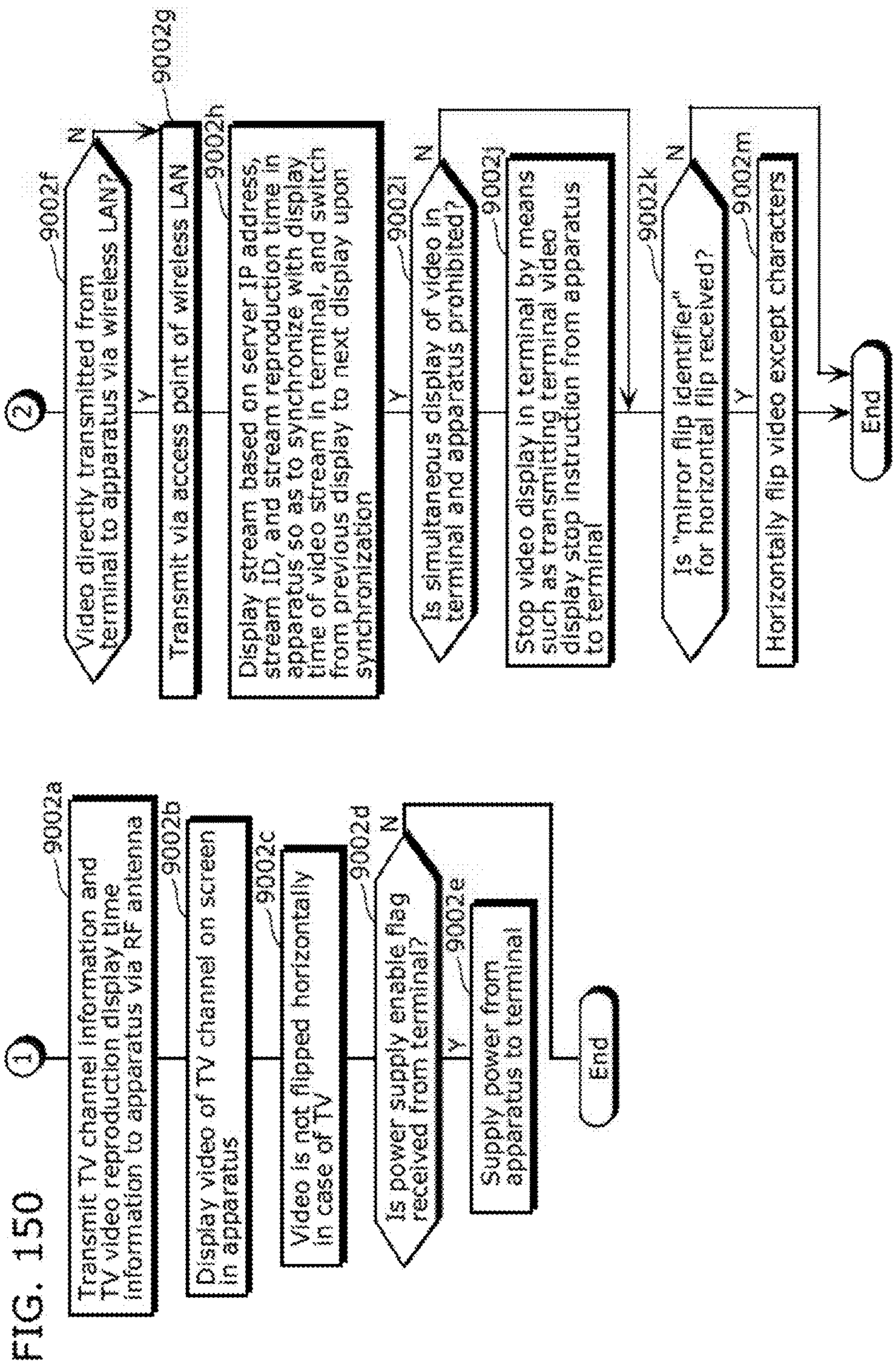

FIG. 150 is a flowchart according to Embodiment 13 of the present invention.

Figure 151:
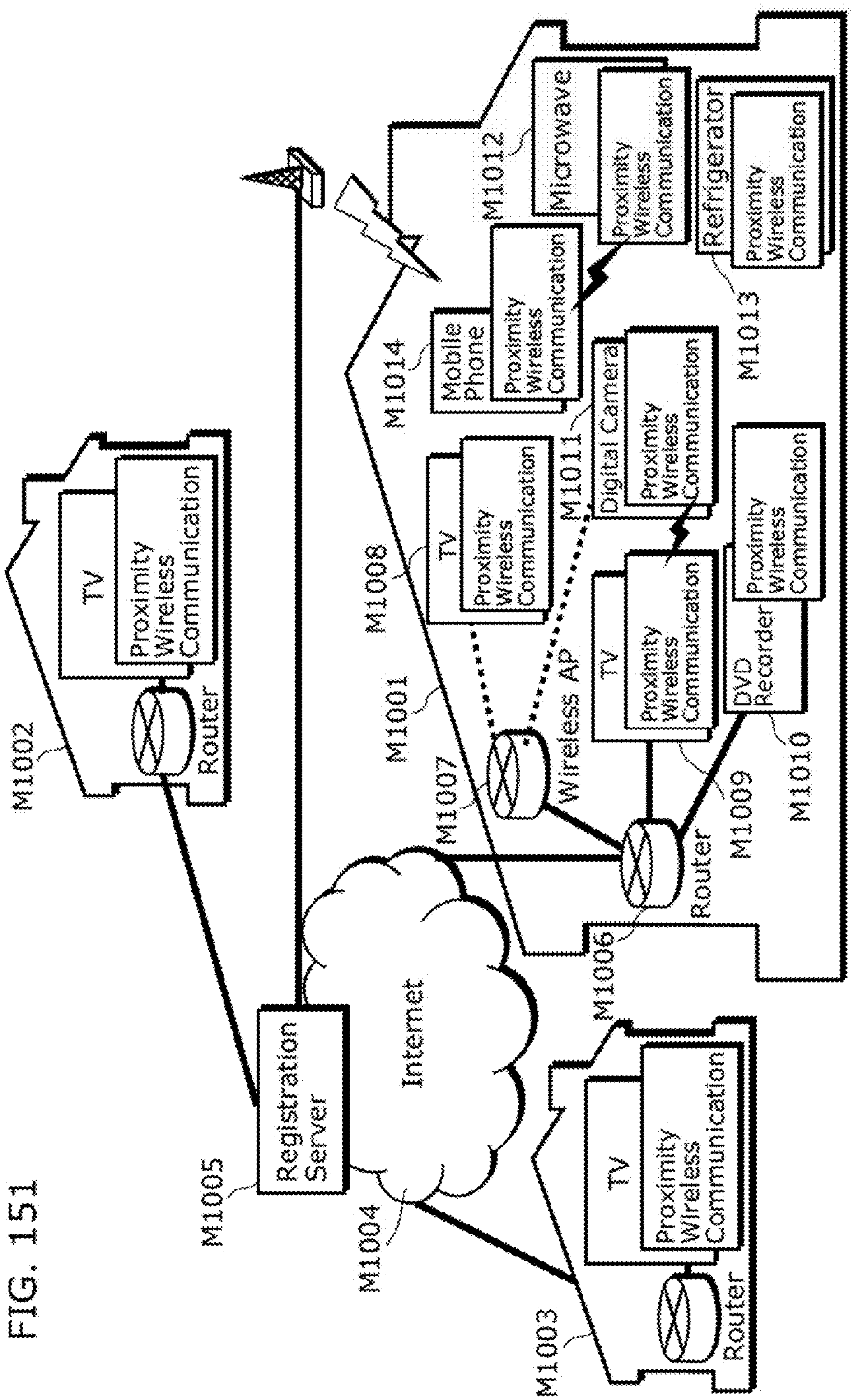

FIG. 151 is a diagram of a network environment in home ID registration.

Figure 152:
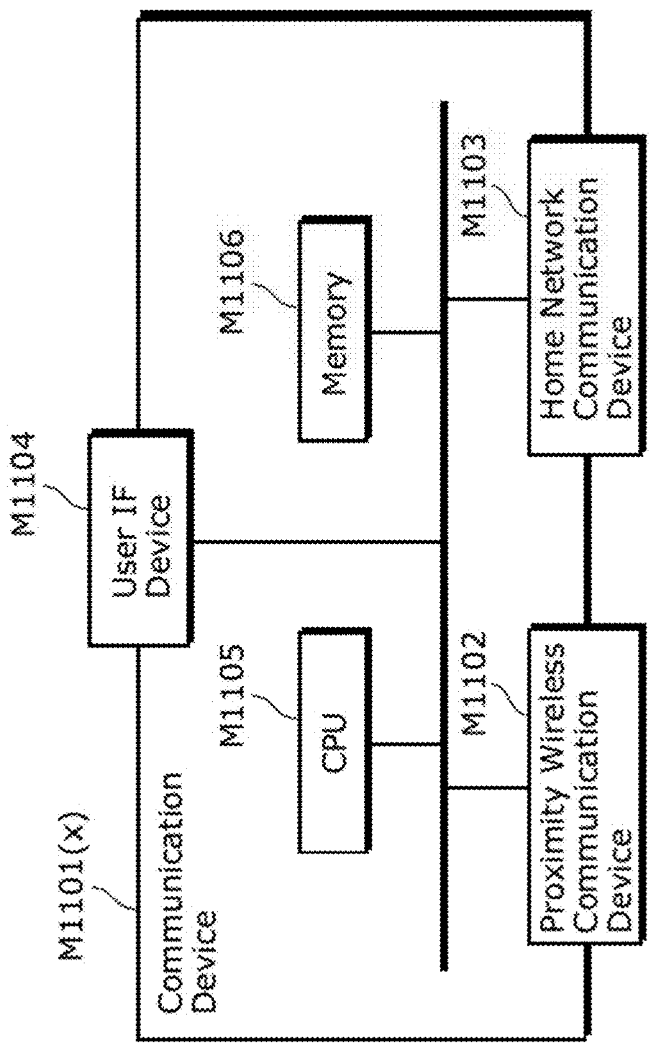

FIG. 152 is a hardware diagram of the communication device in the home ID registration.

Figure 153:
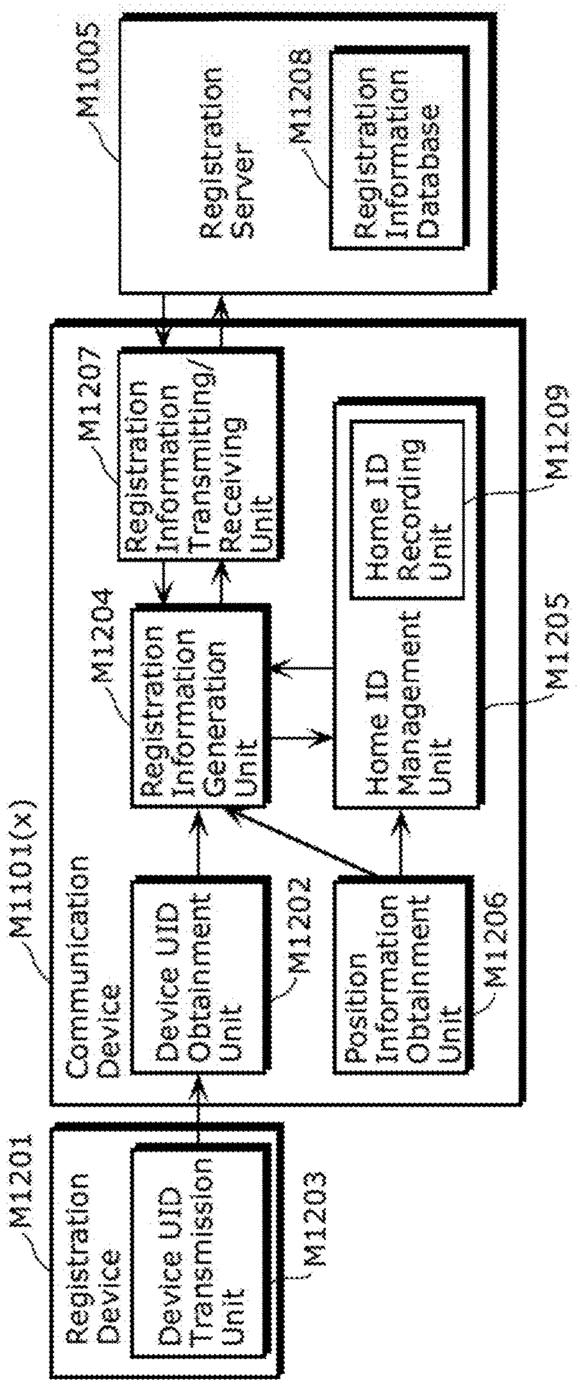

FIG. 153 is a functional block diagram of the communication device in the home ID registration.

Figure 154:
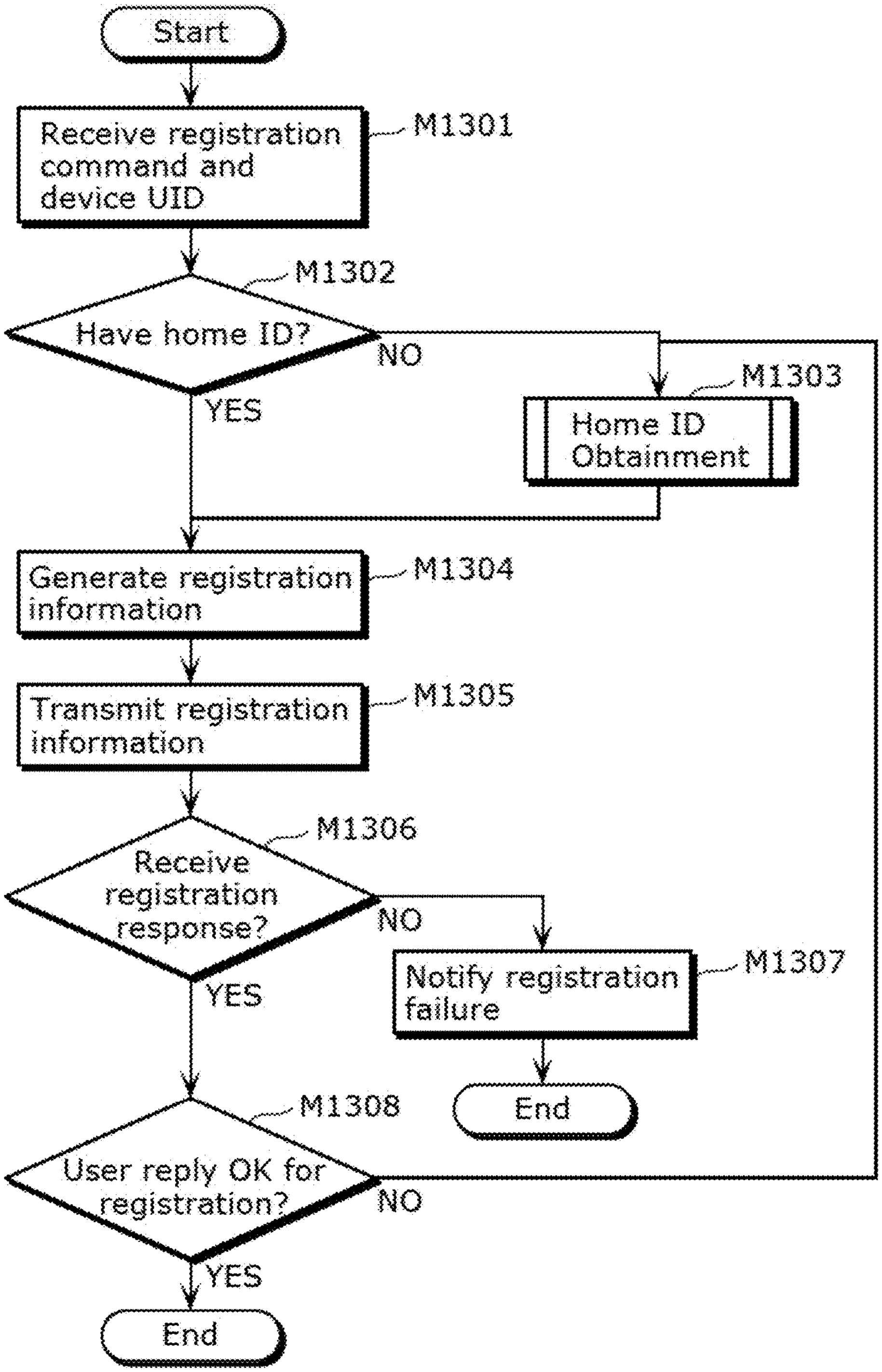

FIG. 154 is a flowchart of the home ID registration.

Figure 155:
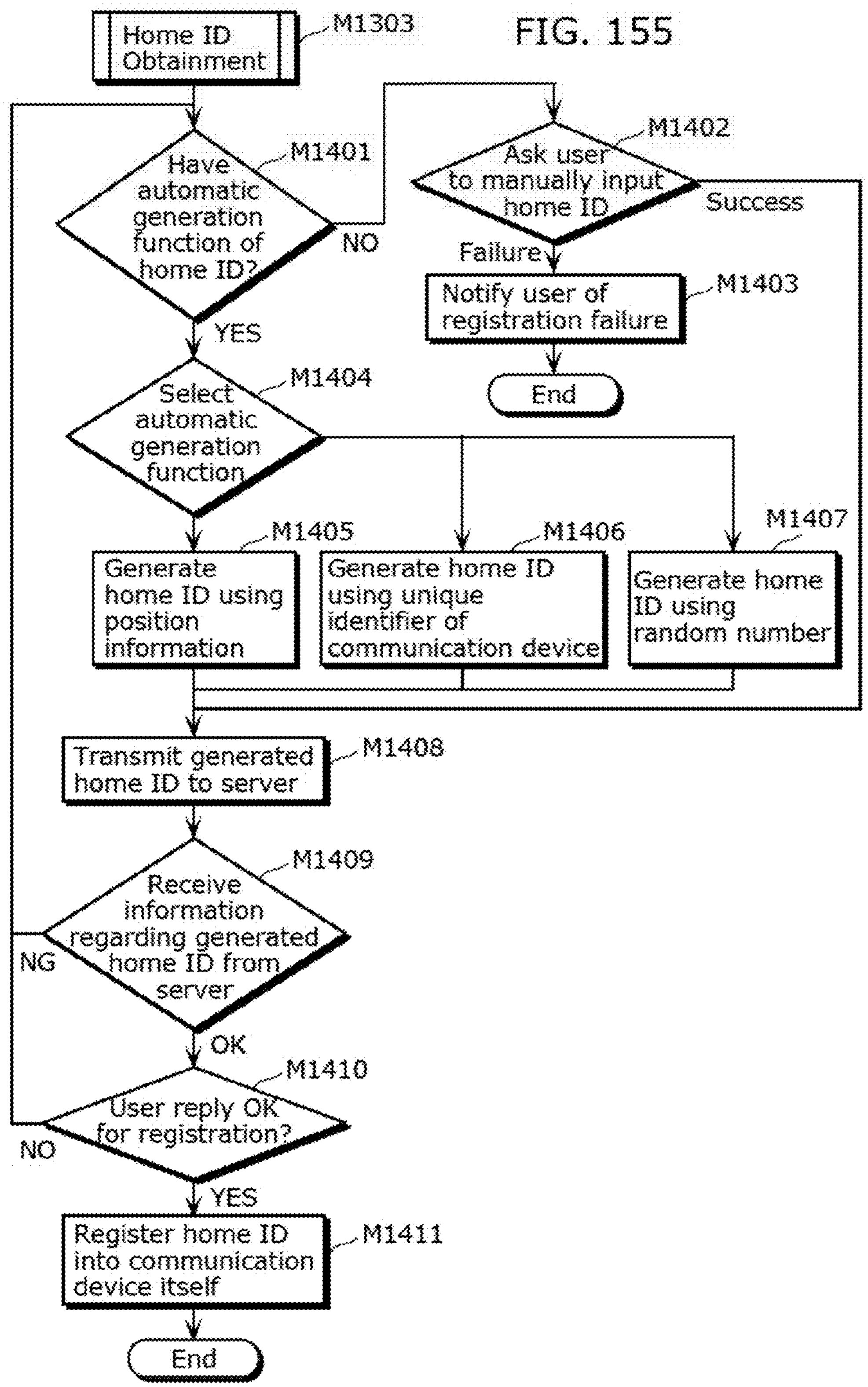

FIG. 155 is a flowchart of home ID obtainment.

Figure 156:
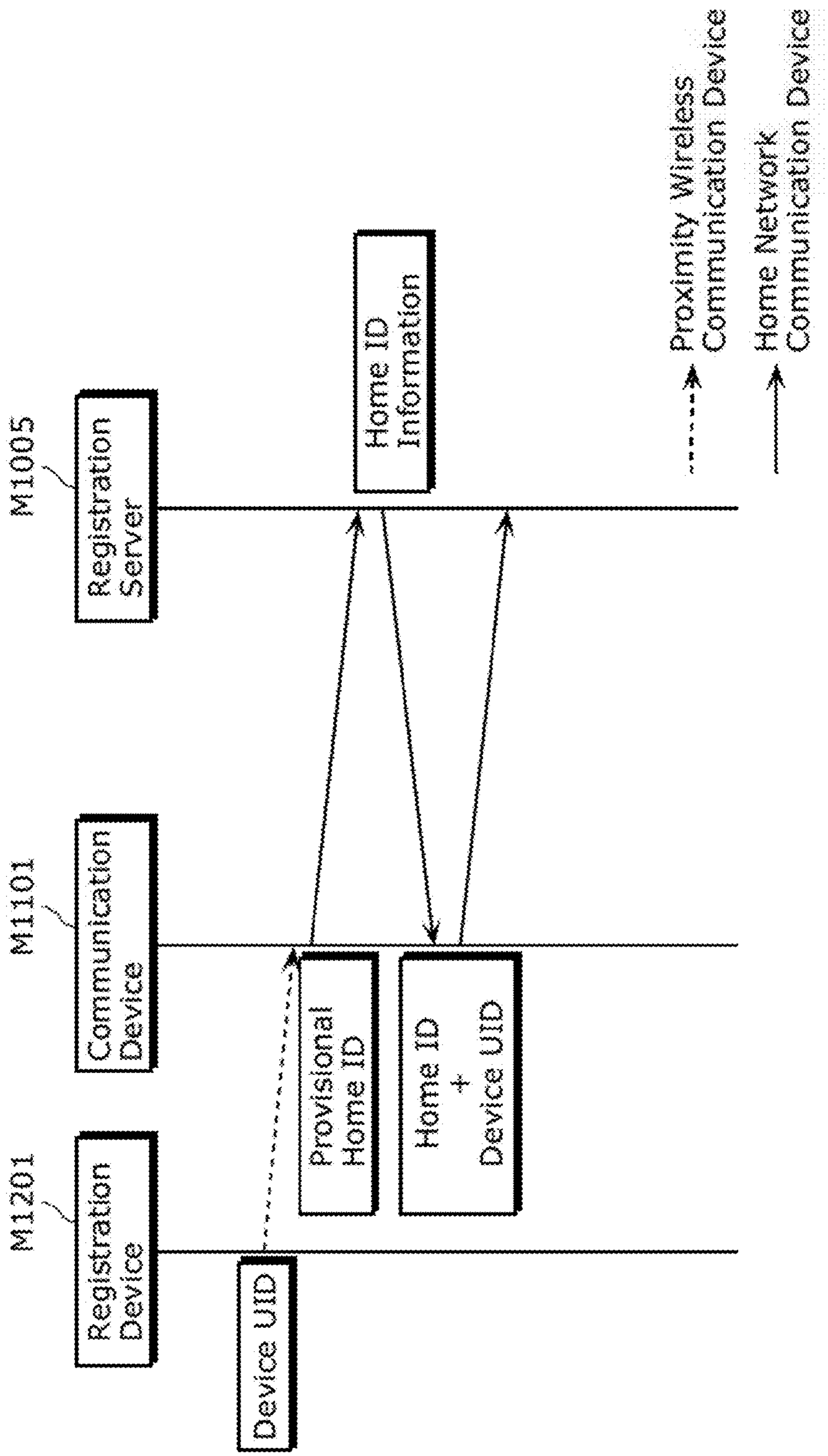

FIG. 156 is a sequence diagram of the home ID registration.

Figure 157:
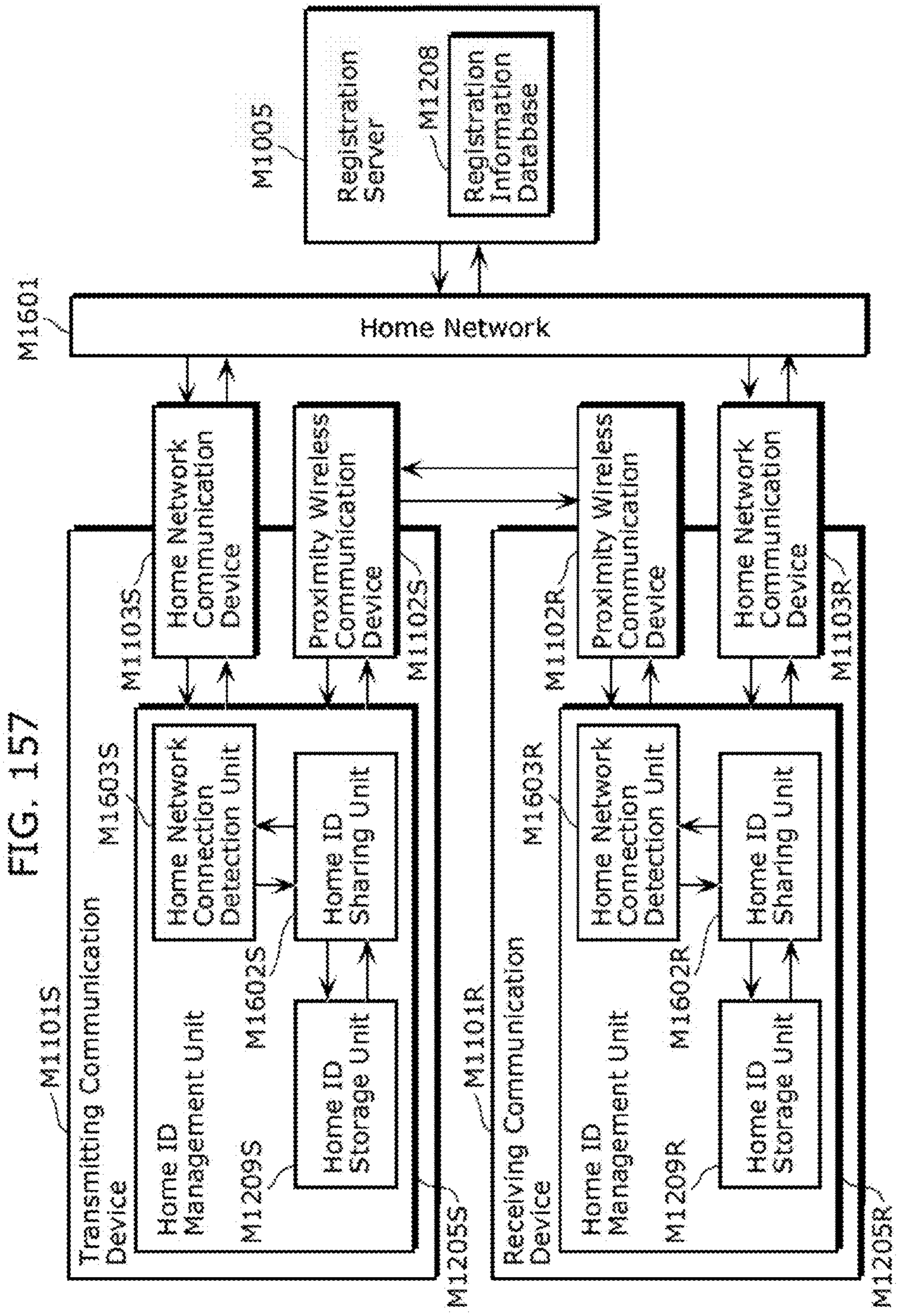

FIG. 157 is a functional block diagram of communication devices in home ID sharing.

Figure 158:
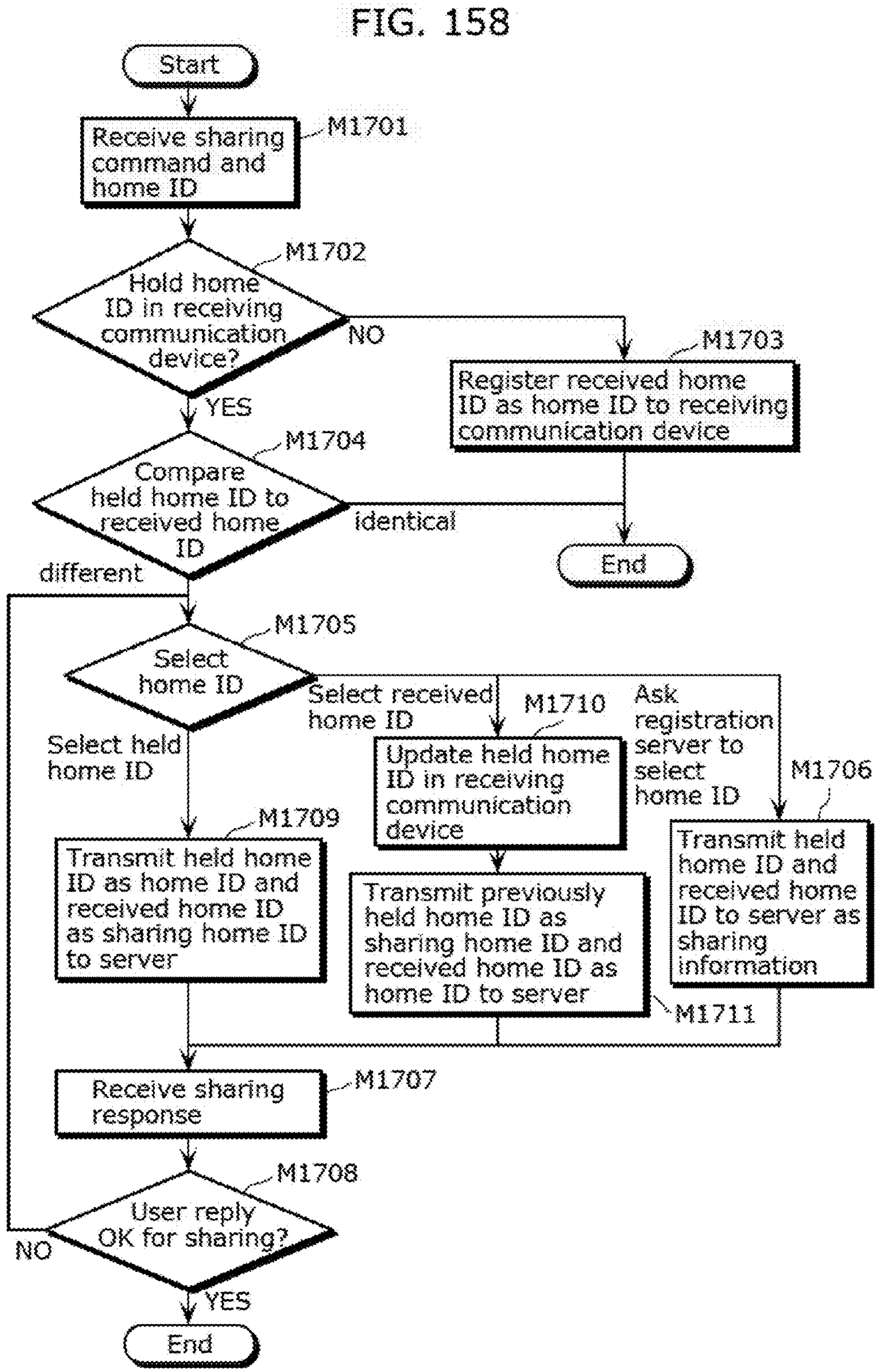

FIG. 158 is a flowchart of processing performed by a receiving communication device in the home ID sharing (using proximity wireless communication).

Figure 159:
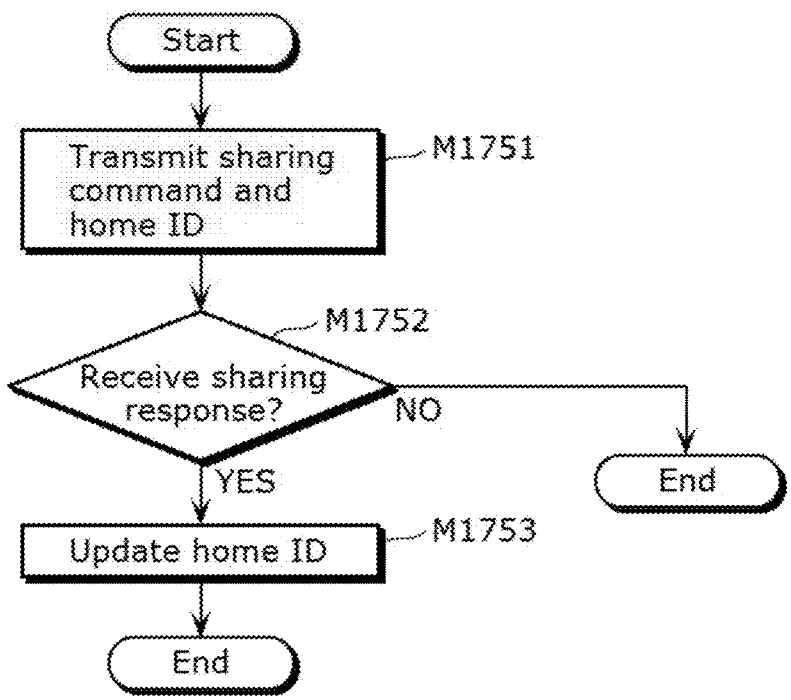

FIG. 159 is a flowchart of processing performed by a transmitting communication device in the home ID sharing (using proximity wireless communication).

Figure 160:
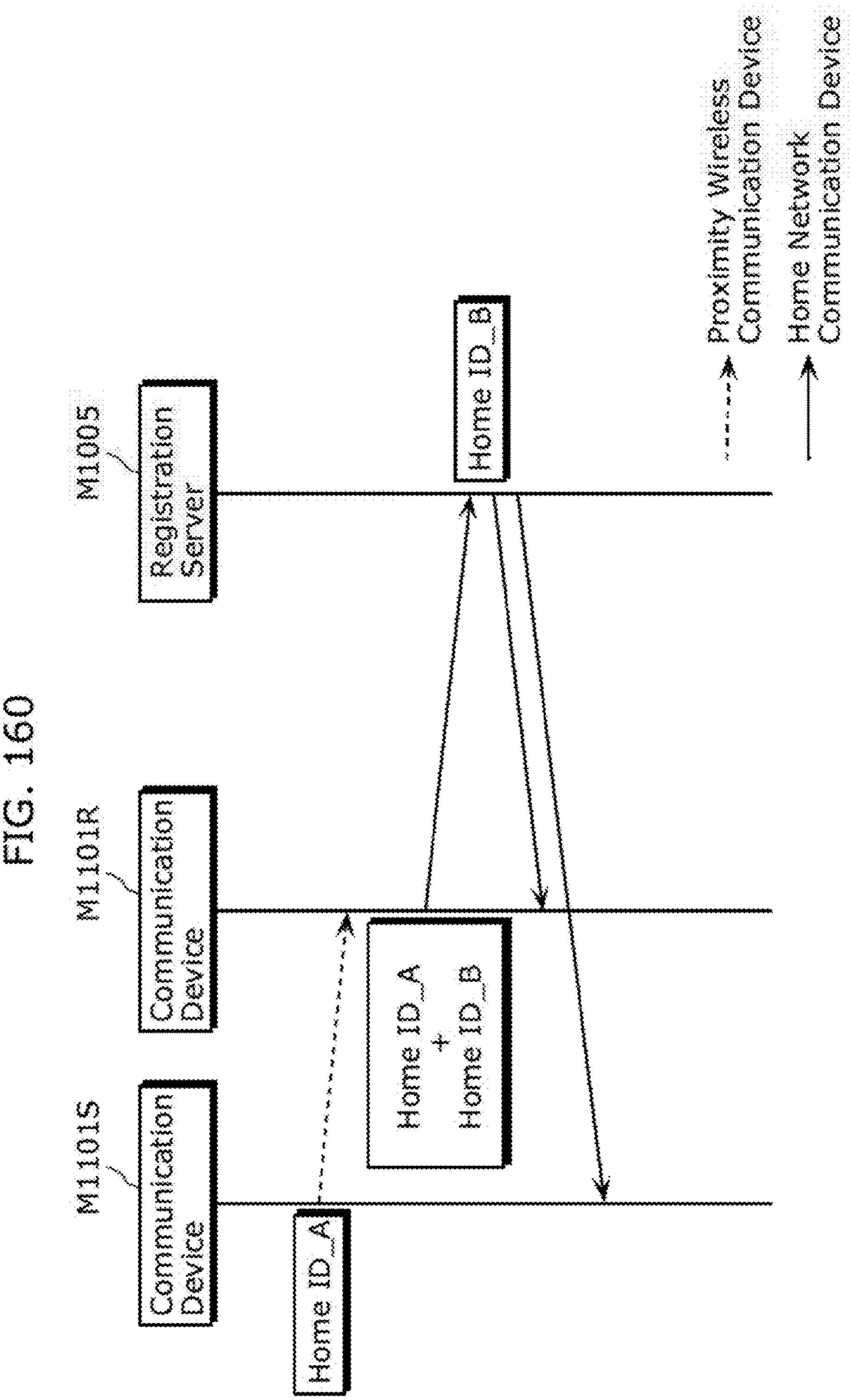

FIG. 160 is a sequence diagram of the home ID sharing (using proximity wireless communication).

Figure 161:
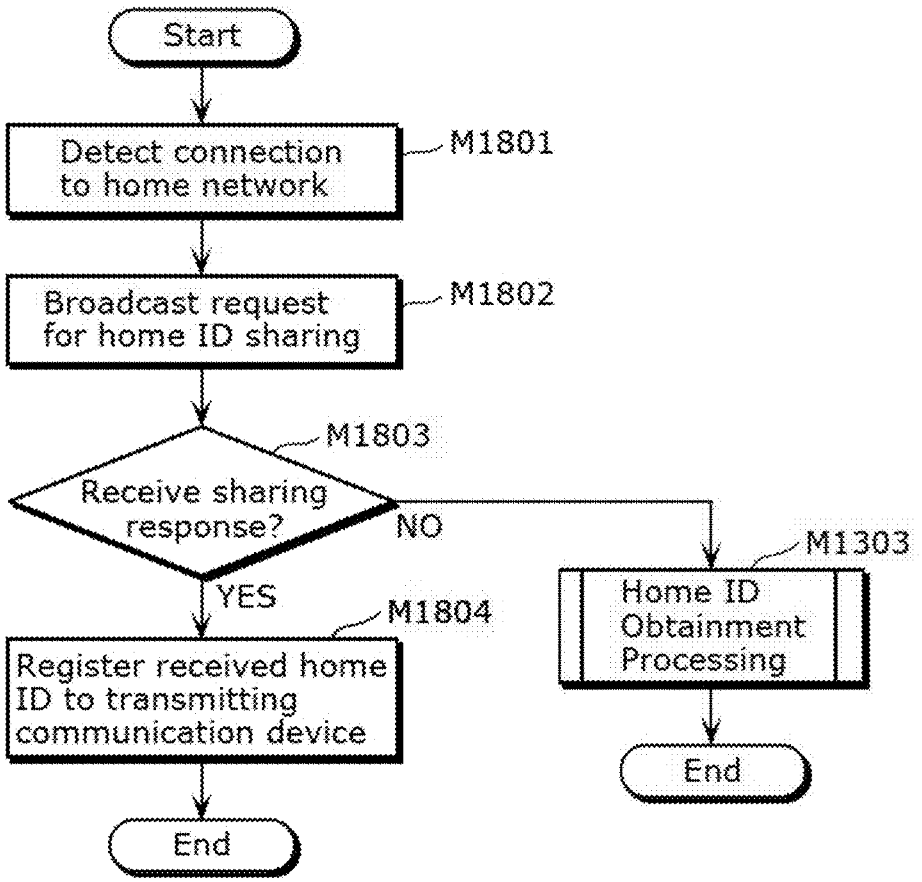

FIG. 161 is a flowchart of processing performed by the receiving communication device in the home ID sharing (using a home network device).

Figure 162:
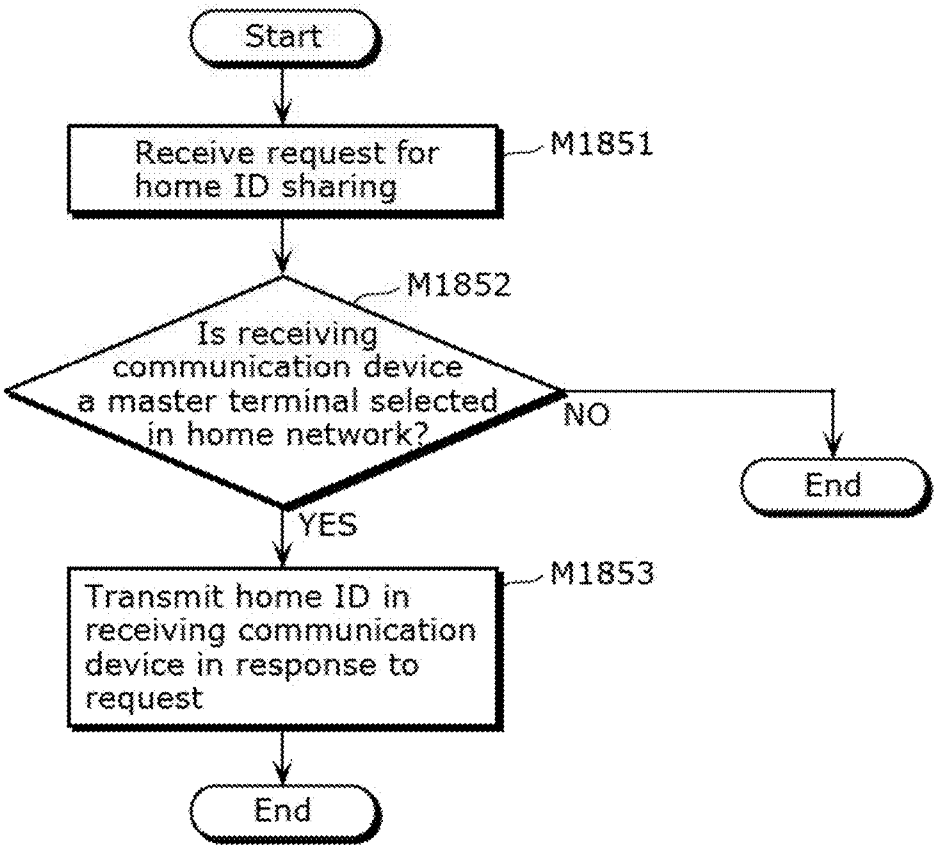

FIG. 162 is a flowchart of processing performed by the transmitting communication device in the home ID sharing (using the home network device).

Figure 163:
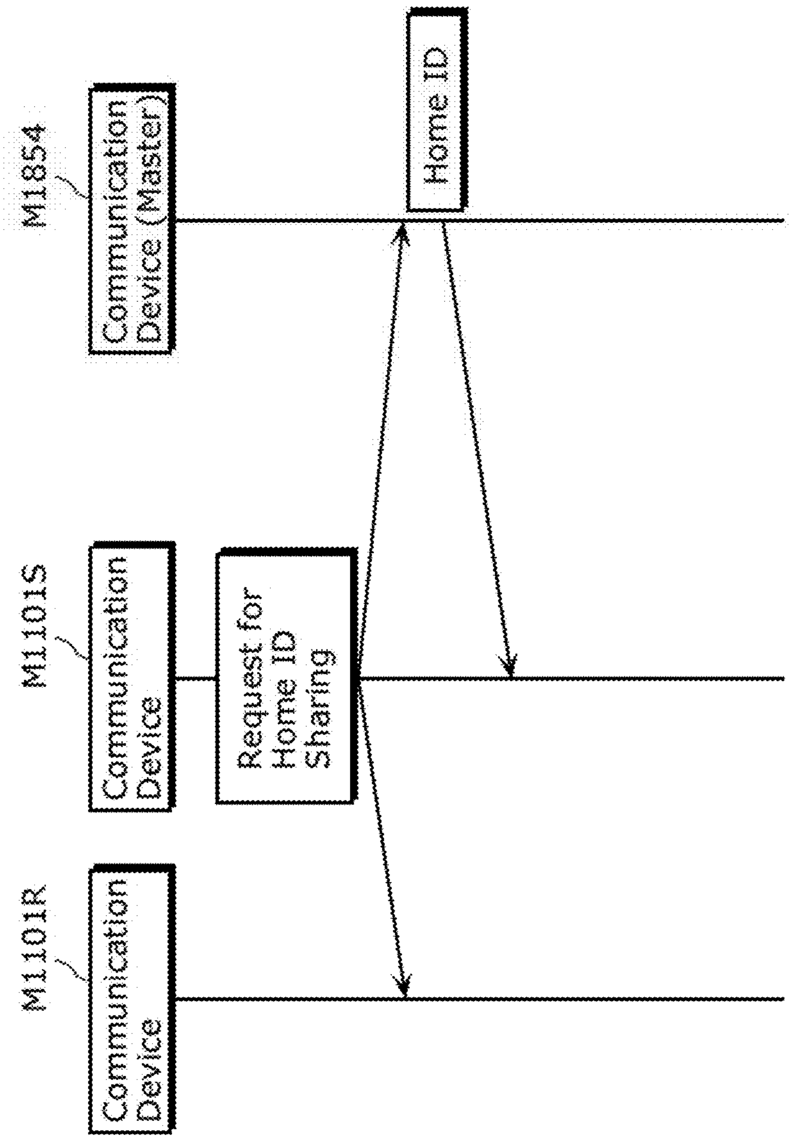

FIG. 163 is a sequence diagram of the home ID sharing (using the home network device).

Figure 164:
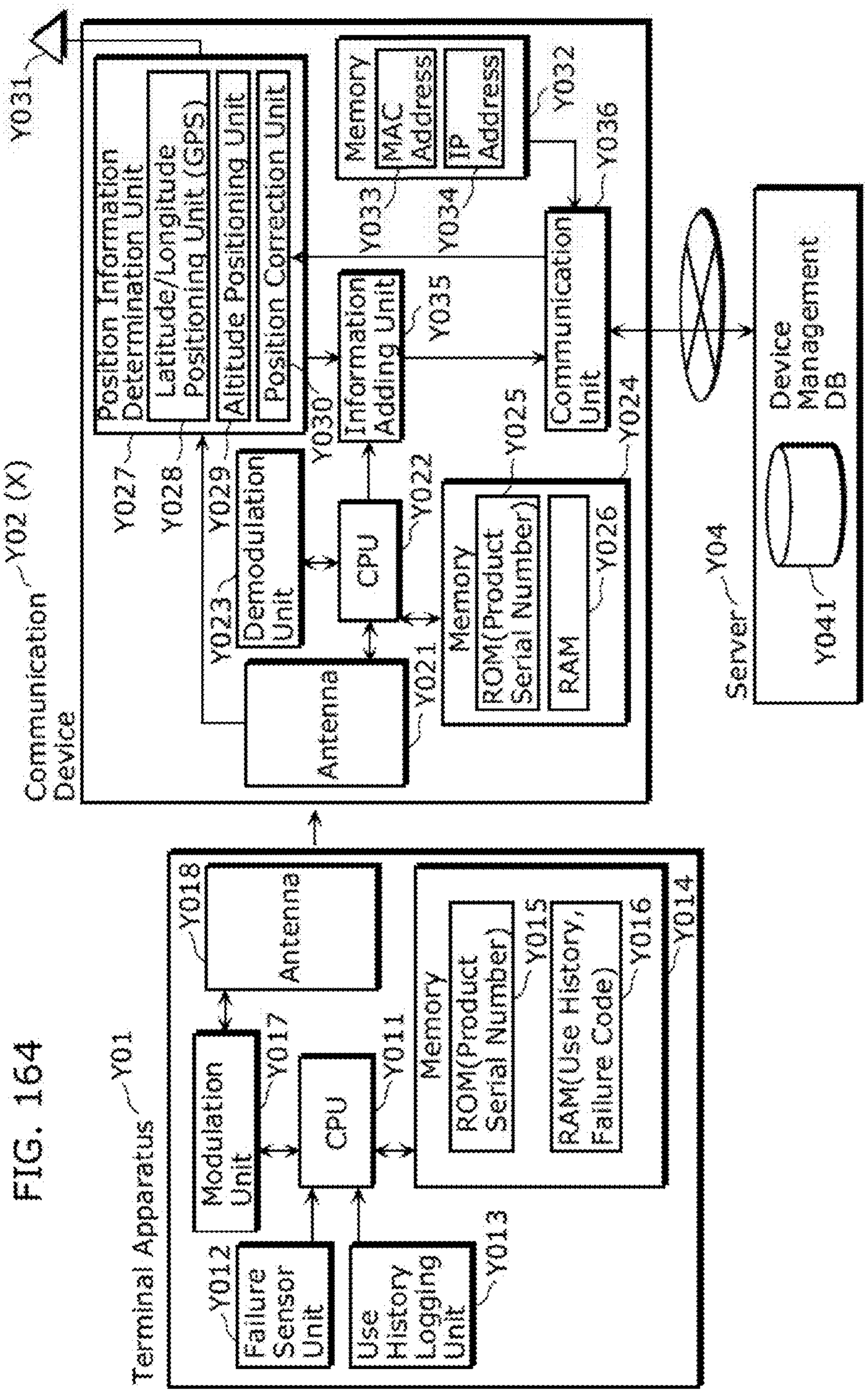

FIG. 164 is a block diagram of a device management system according to Embodiment 16 of the present invention.

Figure 165:
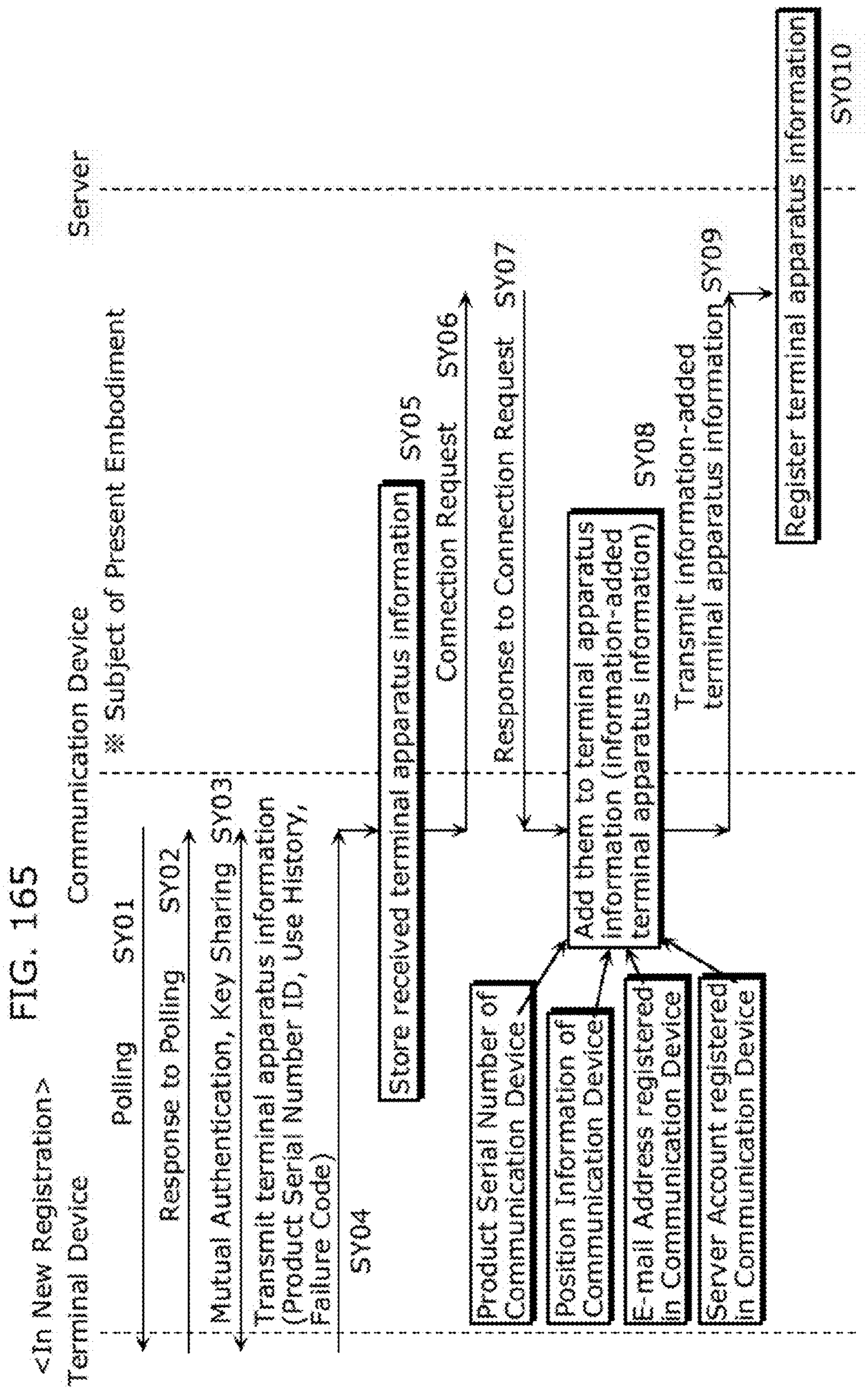

FIG. 165 is a sequence diagram of the device management system according to Embodiment 16 of the present invention.

Figure 166:
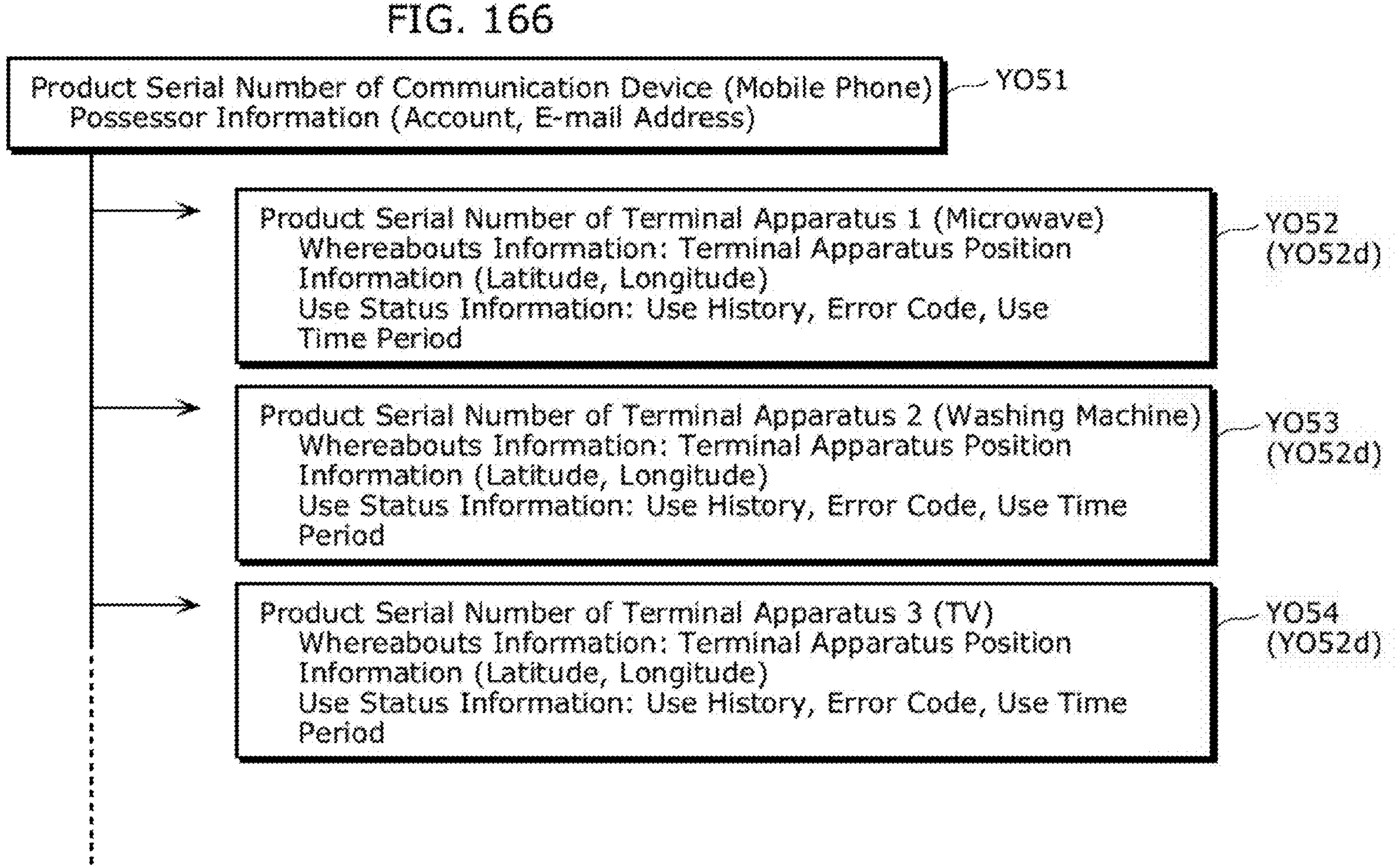

FIG. 166 is a schematic diagram of a structure of a device management database according to Embodiment 16 of the present invention.

Figure 167:
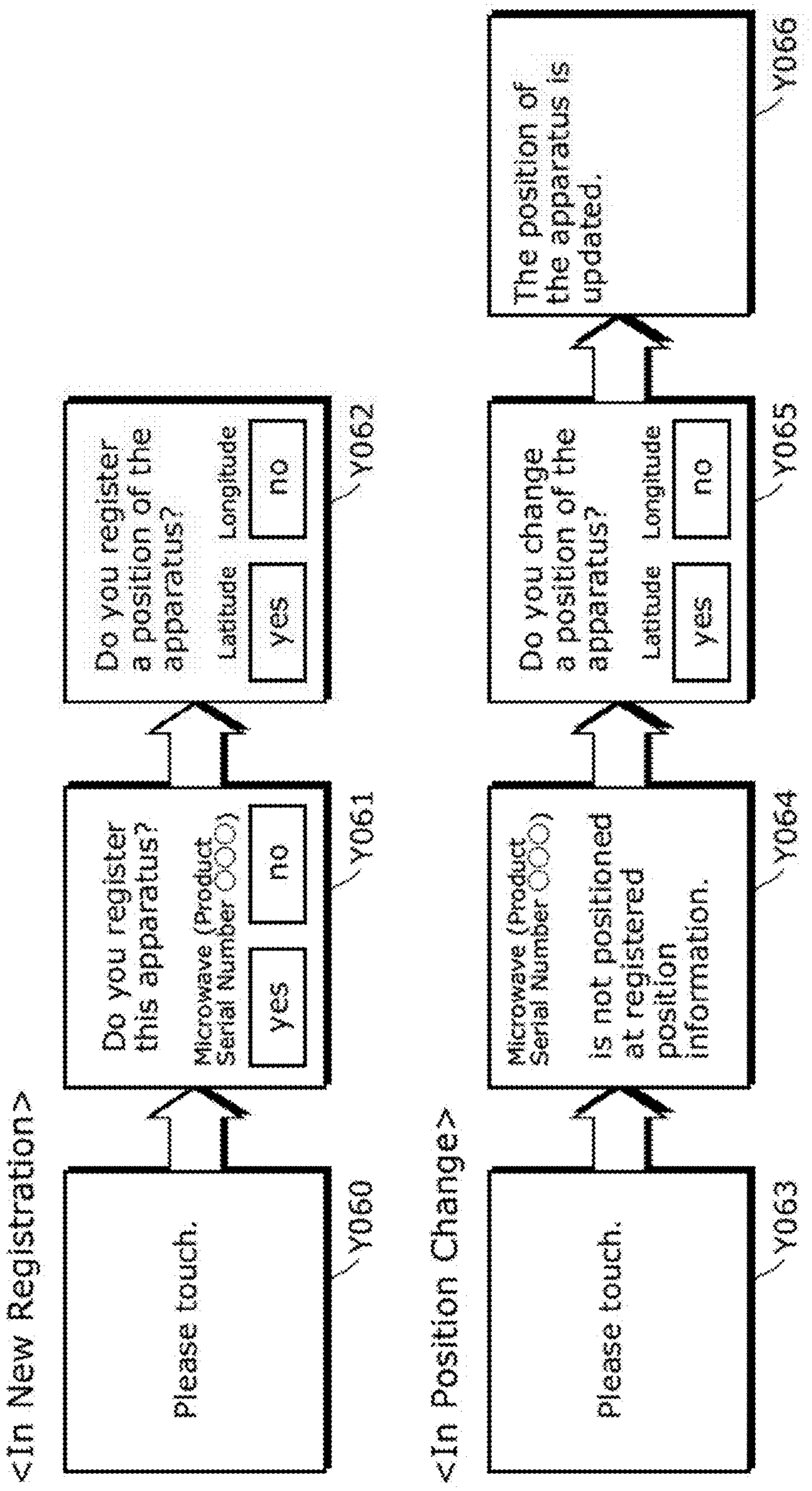

FIG. 167 is a schematic diagram of display of the device management system according to Embodiment 16 of the present invention.

Figure 168:
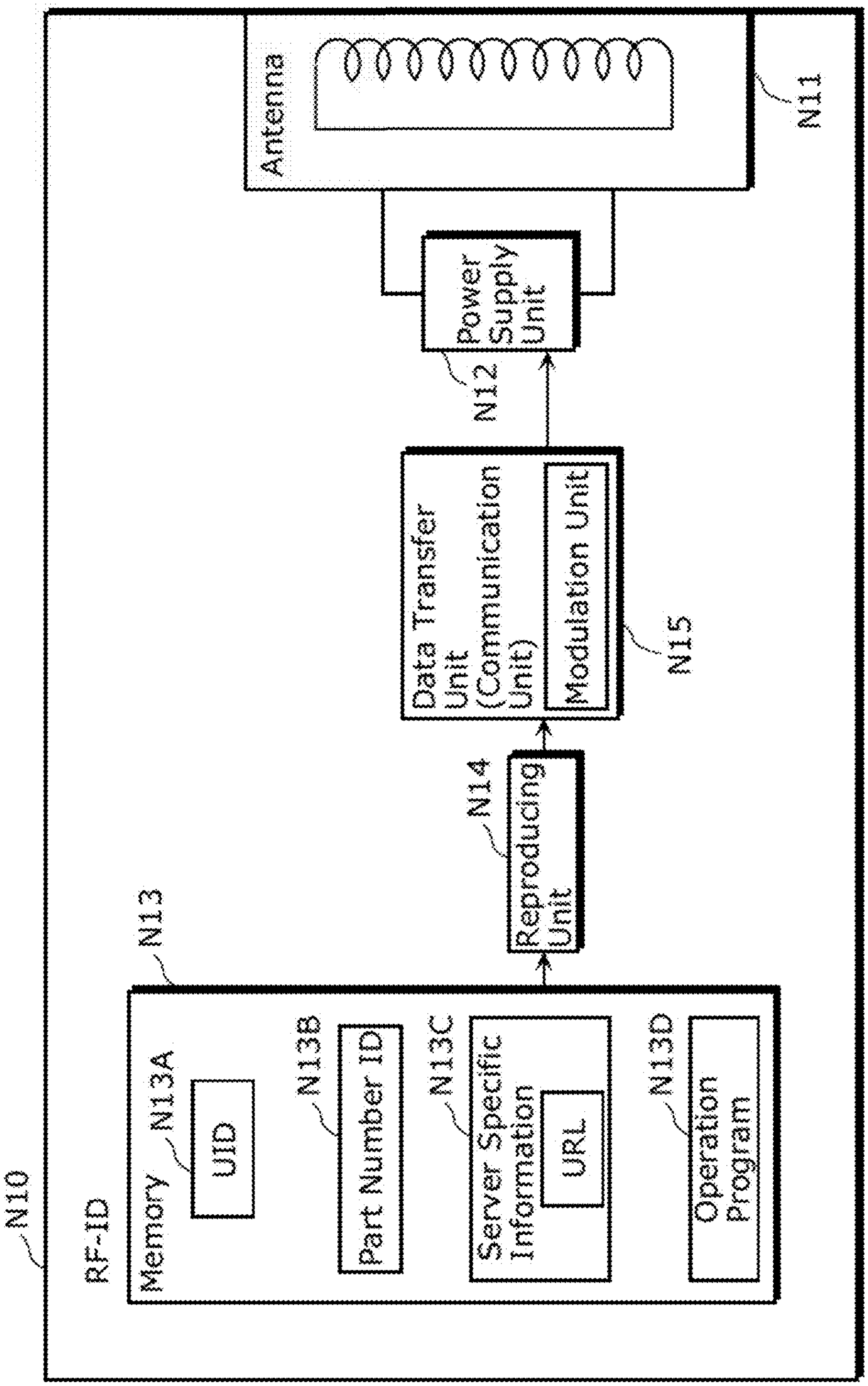

FIG. 168 is a functional block diagram of a RF-ID unit N10 according to Embodiment 17 of the present invention.

Figure 169:
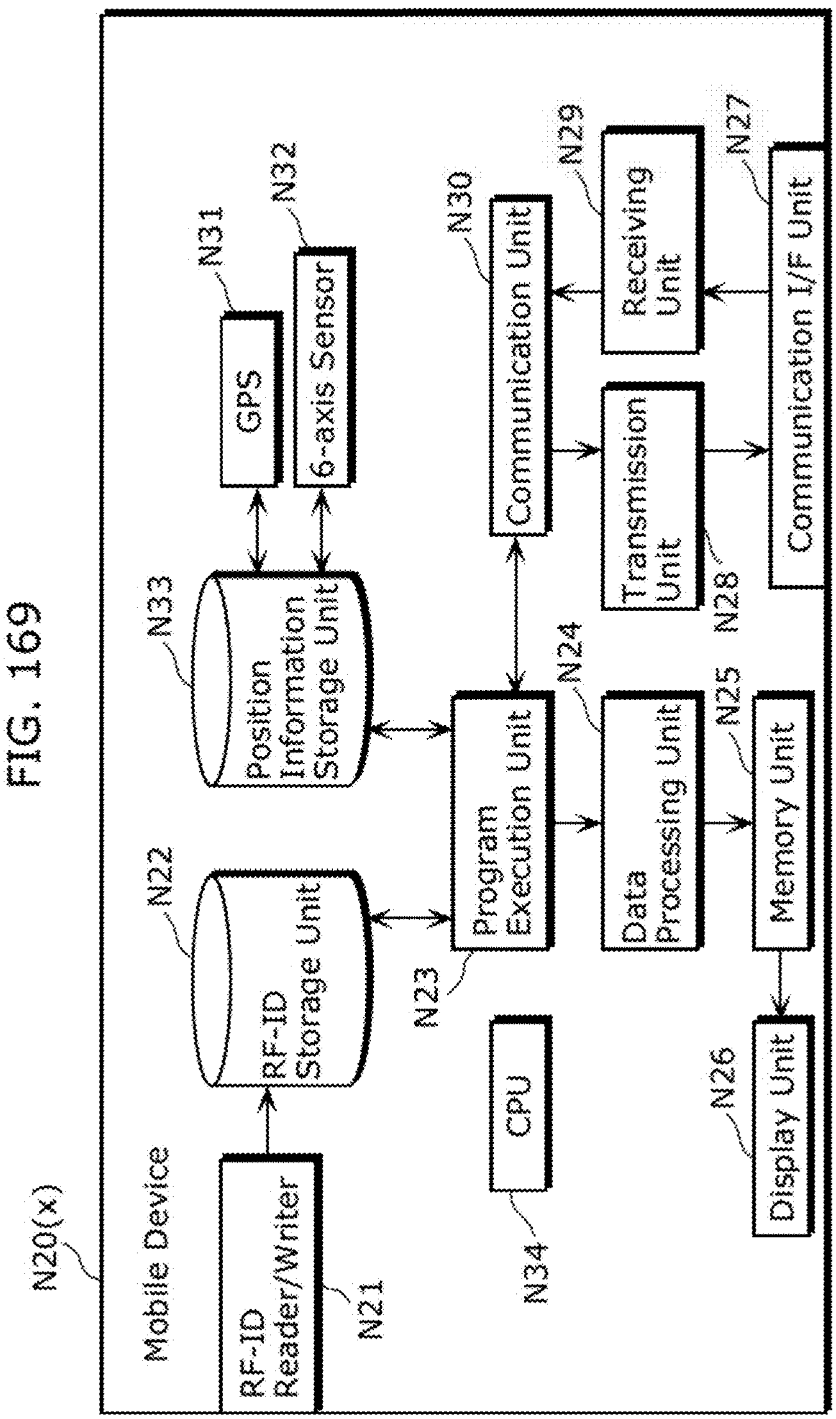

FIG. 169 is a functional block diagram of a mobile device N20 according to Embodiment 17 of the present invention.

Figure 170:
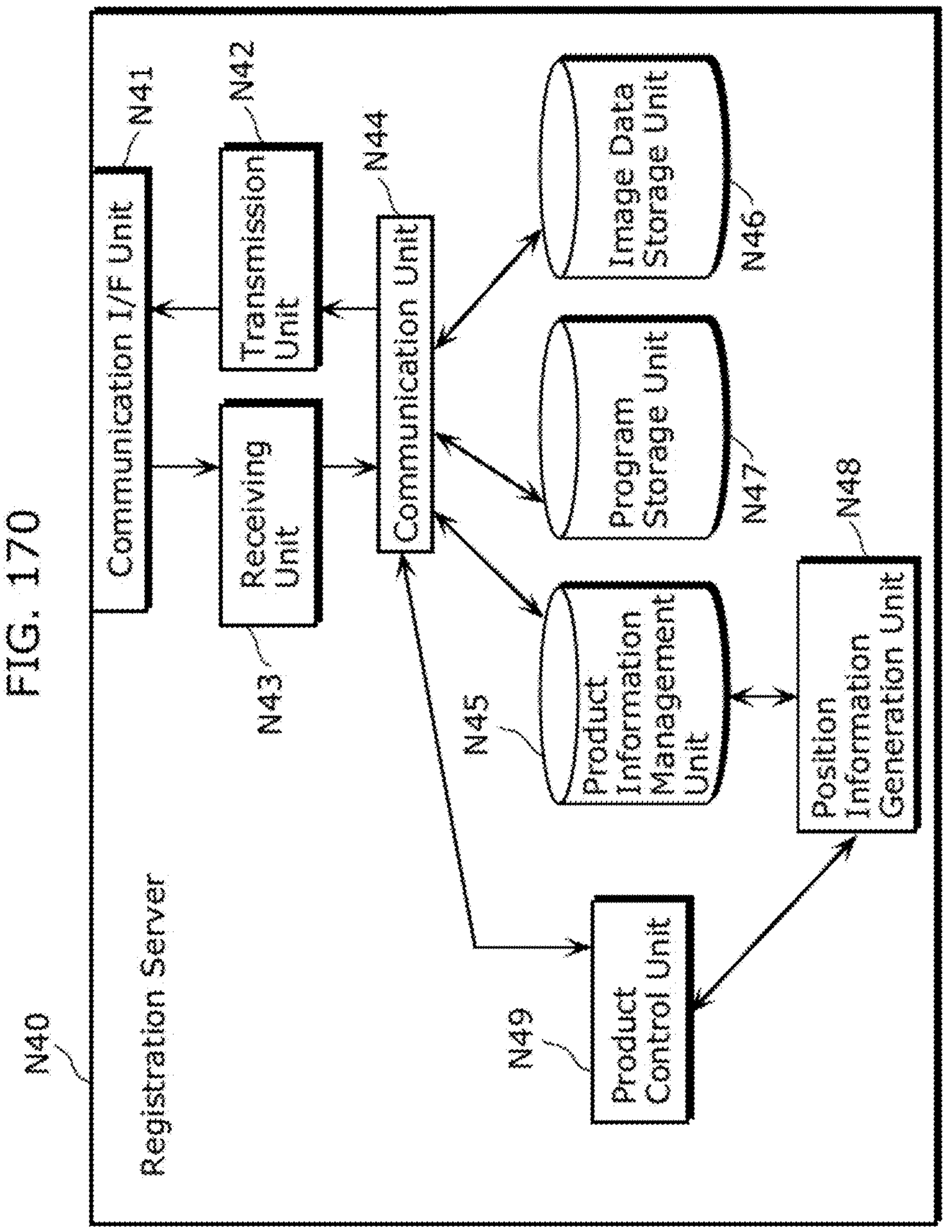

FIG. 170 is a functional block diagram of a registration server N40 according to Embodiment 17 of the present invention.

Figure 171:
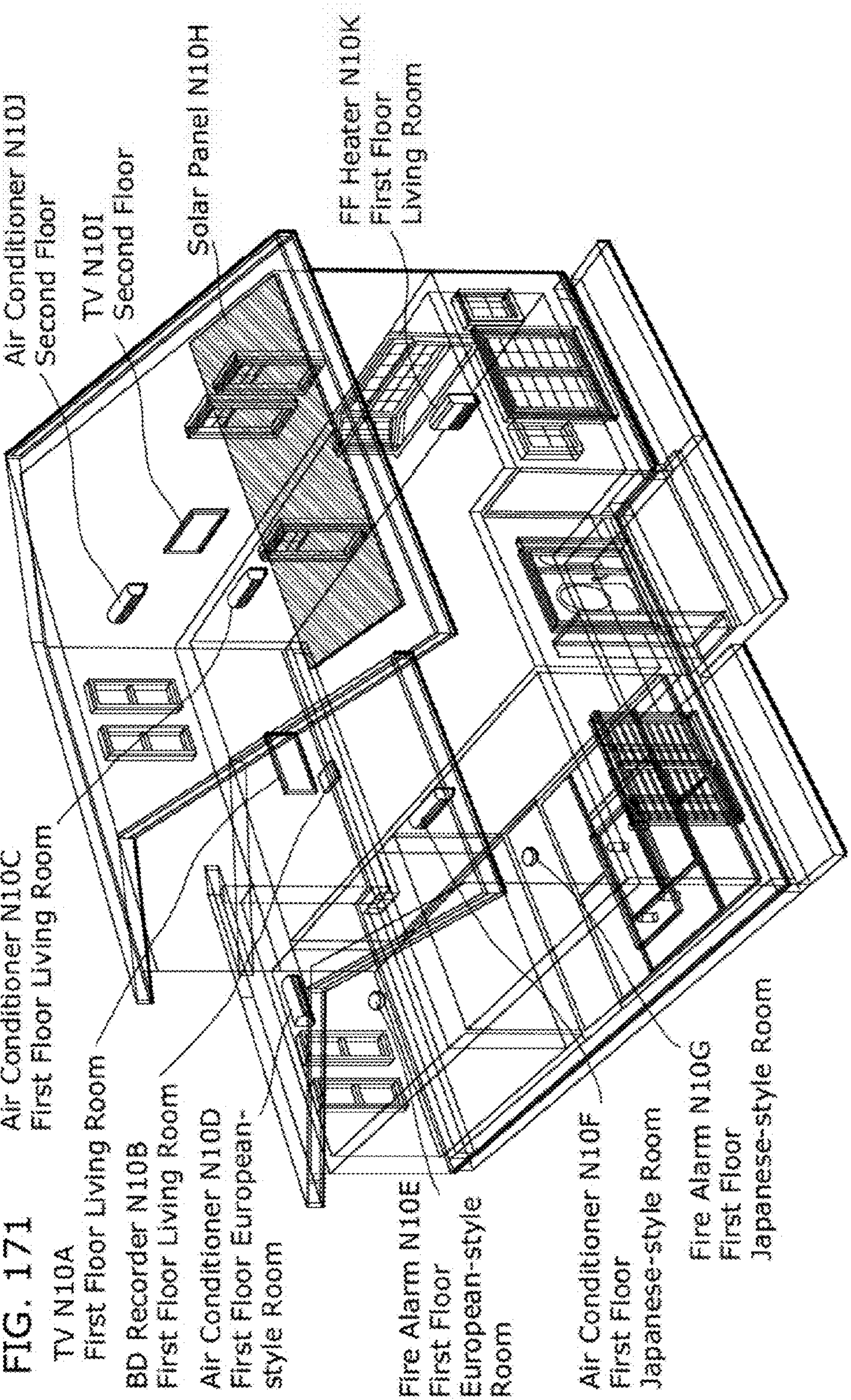

FIG. 171 is a diagram illustrating an example of an arrangement of networked products according to Embodiment 17 of the present invention.

Figure 172:
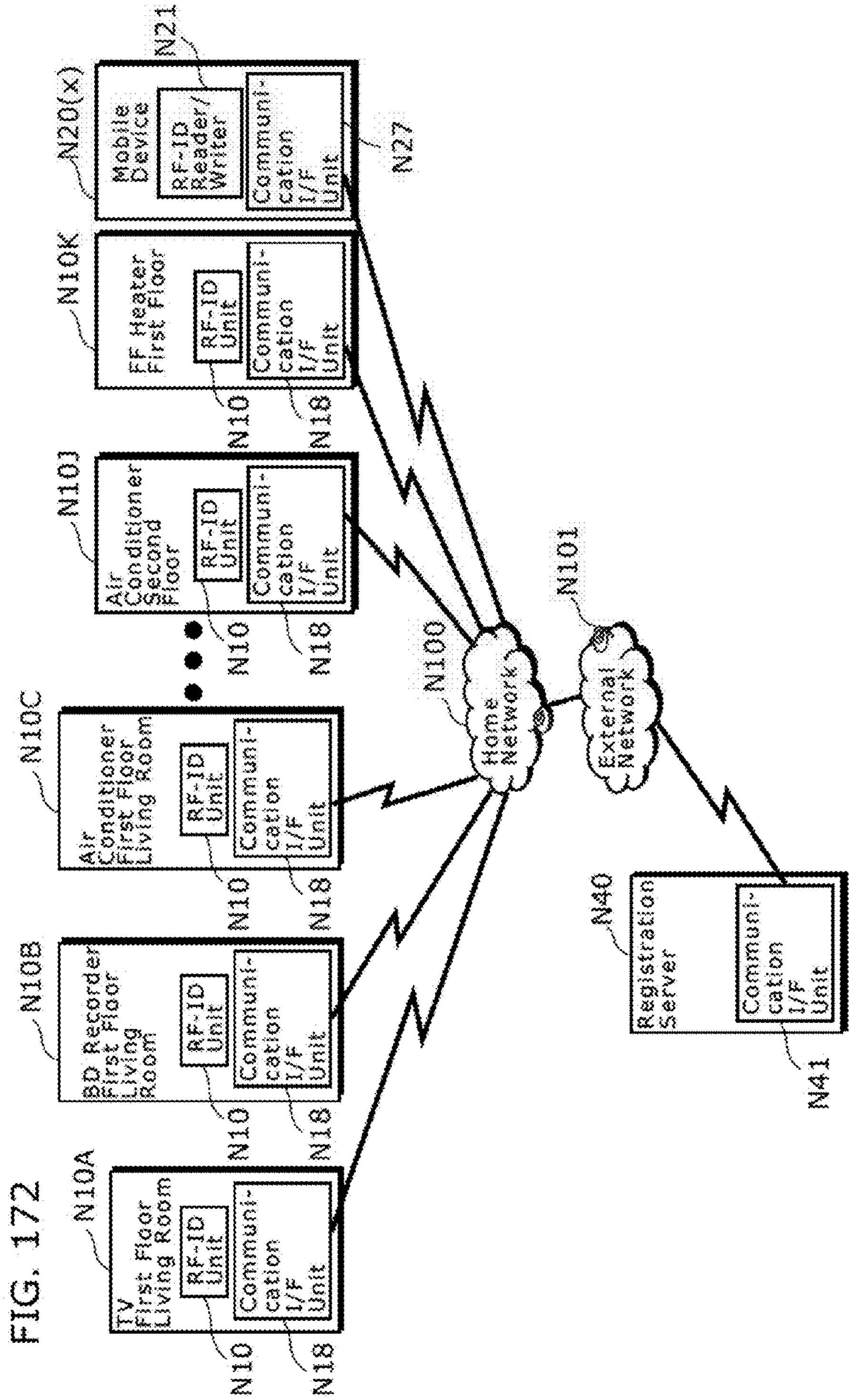

FIG. 172 is a diagram illustrating an example of a system according to Embodiment 17 of the present invention.

Figure 173:
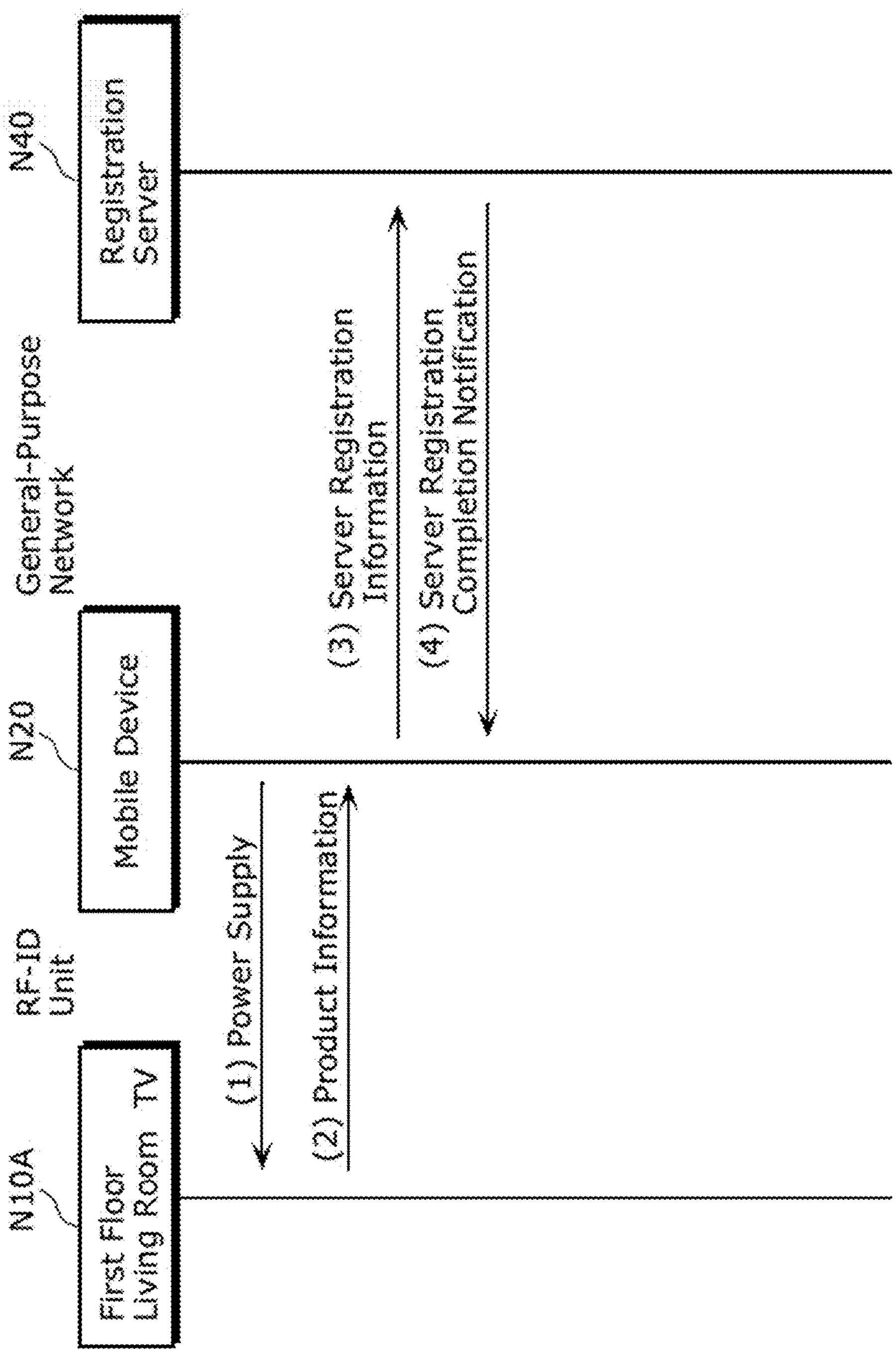

FIG. 173 is a sequence diagram for registering information of a TV N10A into a registration server N40, according to Embodiment 17 of the present invention.

FIG. 174 is a table illustrating an example of a structure of product information and server registration information according to Embodiment 17 of the present invention.

FIG. 175 is a table illustrating an example of a structure of product information stored in a product information management unit N45 according to Embodiment 17 of the present invention.

Figure 176:
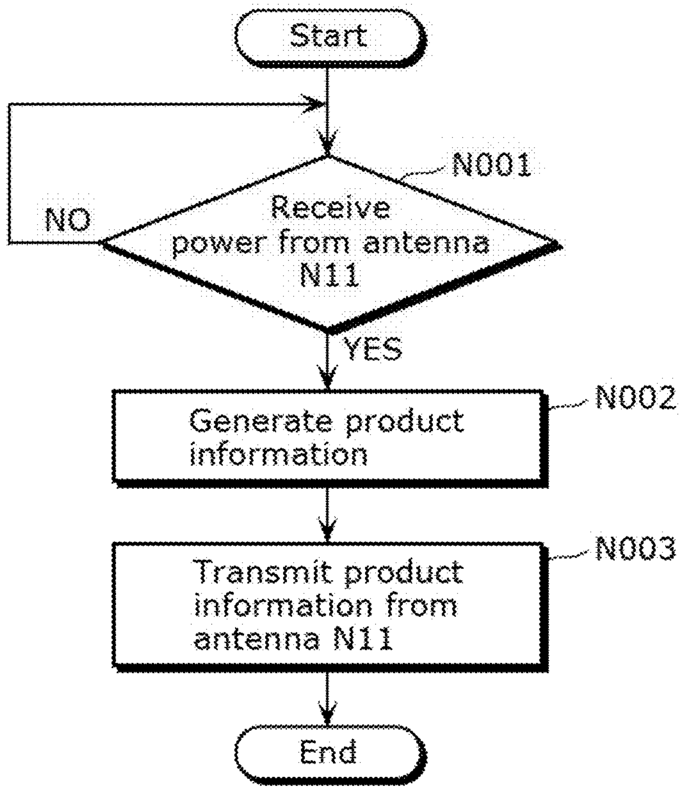

FIG. 176 is a flowchart illustrating an example of processing performed by a RF-ID unit N10 to perform product registration according to Embodiment 17 of the present invention.

Figure 177:
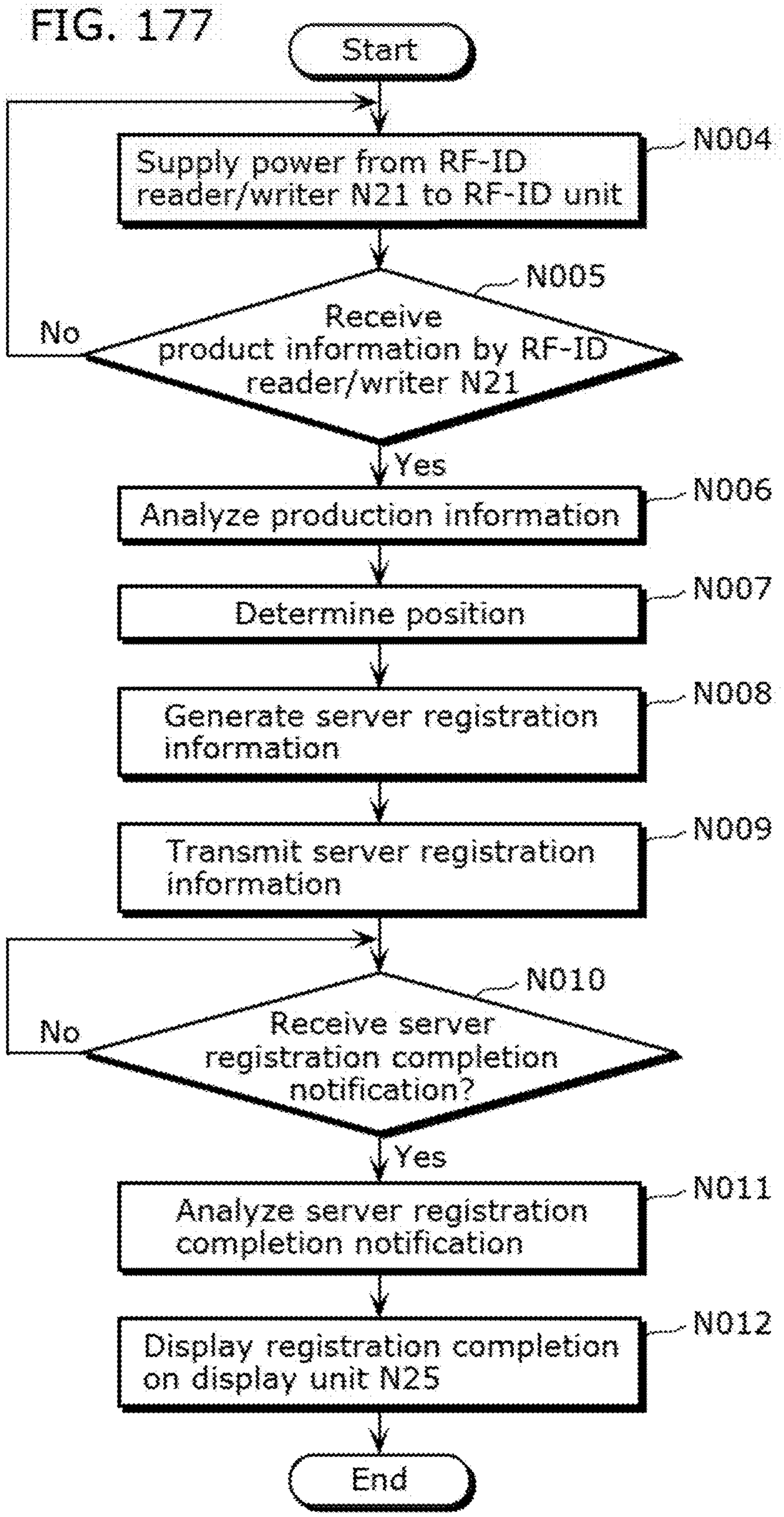

FIG. 177 is a flowchart illustrating an example of processing performed by a mobile device N20 to perform product registration according to Embodiment 17 of the present invention.

Figure 178:
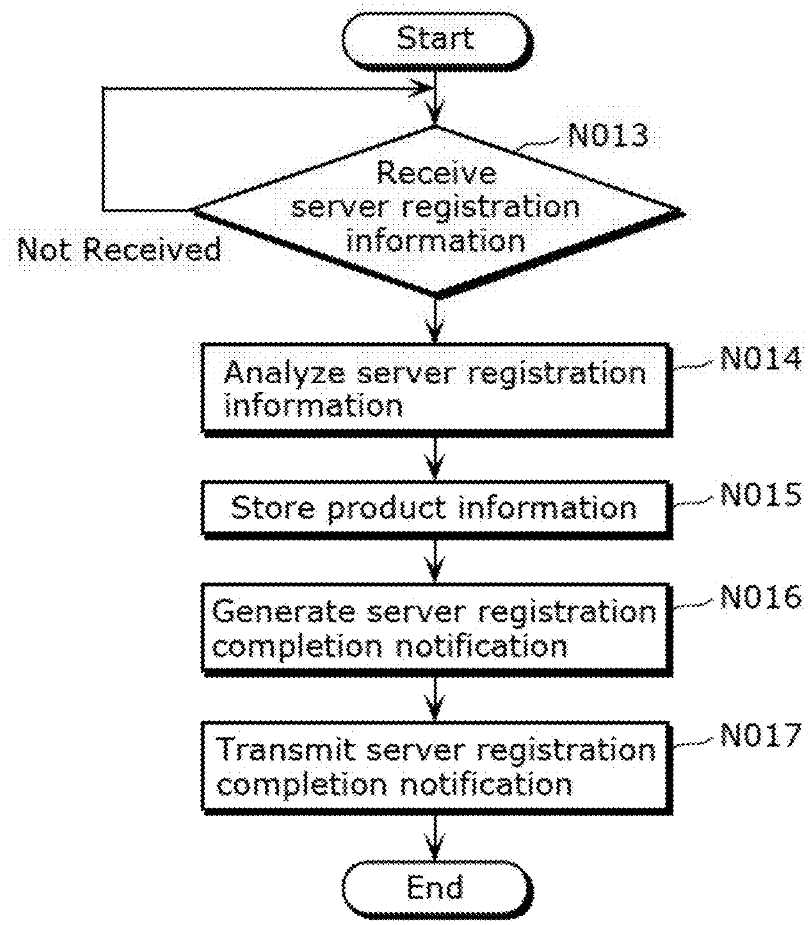

FIG. 178 is a flowchart illustrating an example of processing performed by a registration server N40 to perform product registration according to Embodiment 17 of the present invention.

Figure 179:
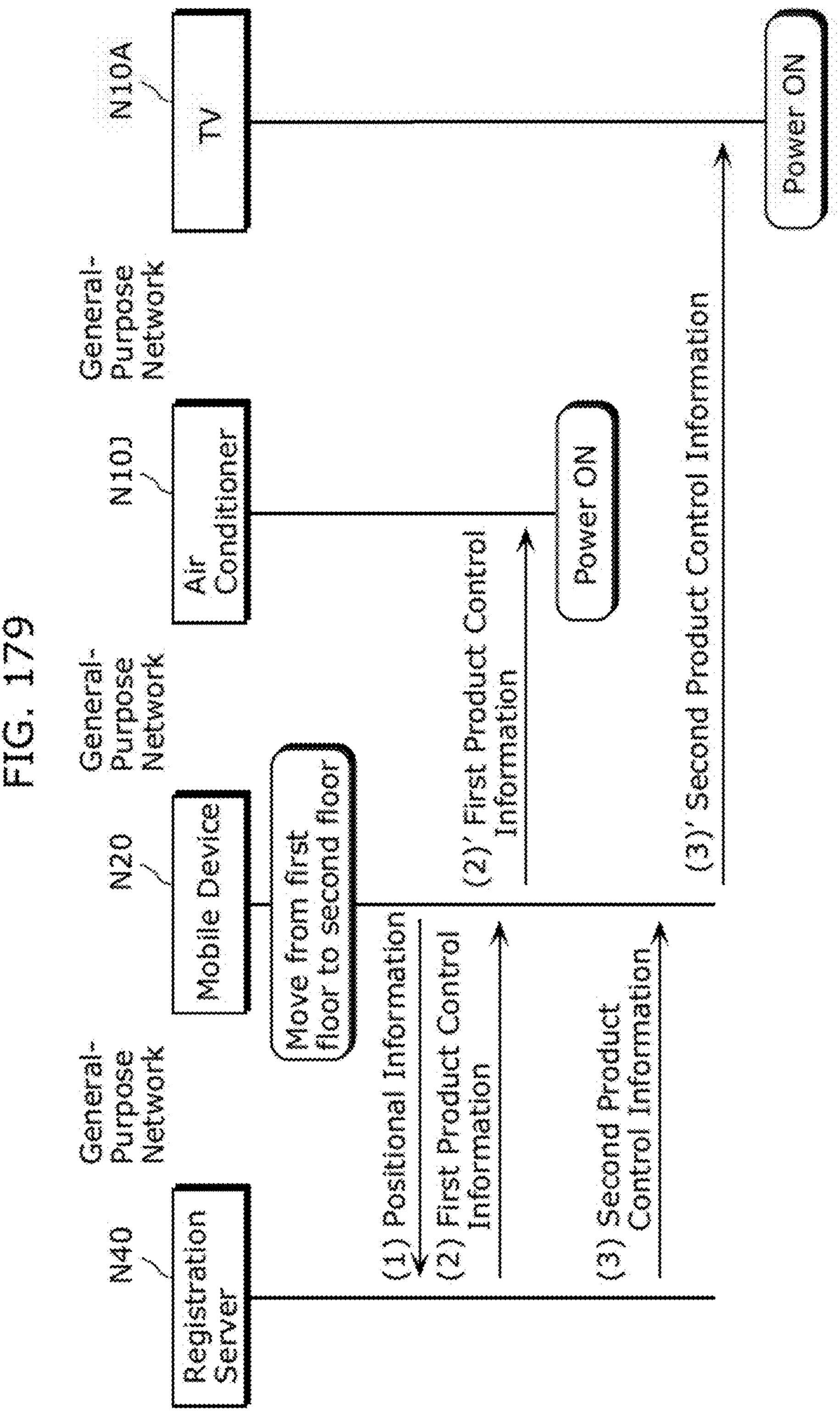

FIG. 179 is a sequence diagram illustrating an example of controlling power for an air conditioner N10J and a TV N10A according to Embodiment 17 of the present invention.

FIG. 180A is a table illustrating an example of a structure of positional information according to Embodiment 17 of the present invention.

FIG. 180B is a table illustrating an example of a structure of first product control information according to Embodiment 17 of the present invention.

FIG. 180C is a table illustrating an example of a structure of second product control information according to Embodiment 17 of the present invention.

Figure 181:
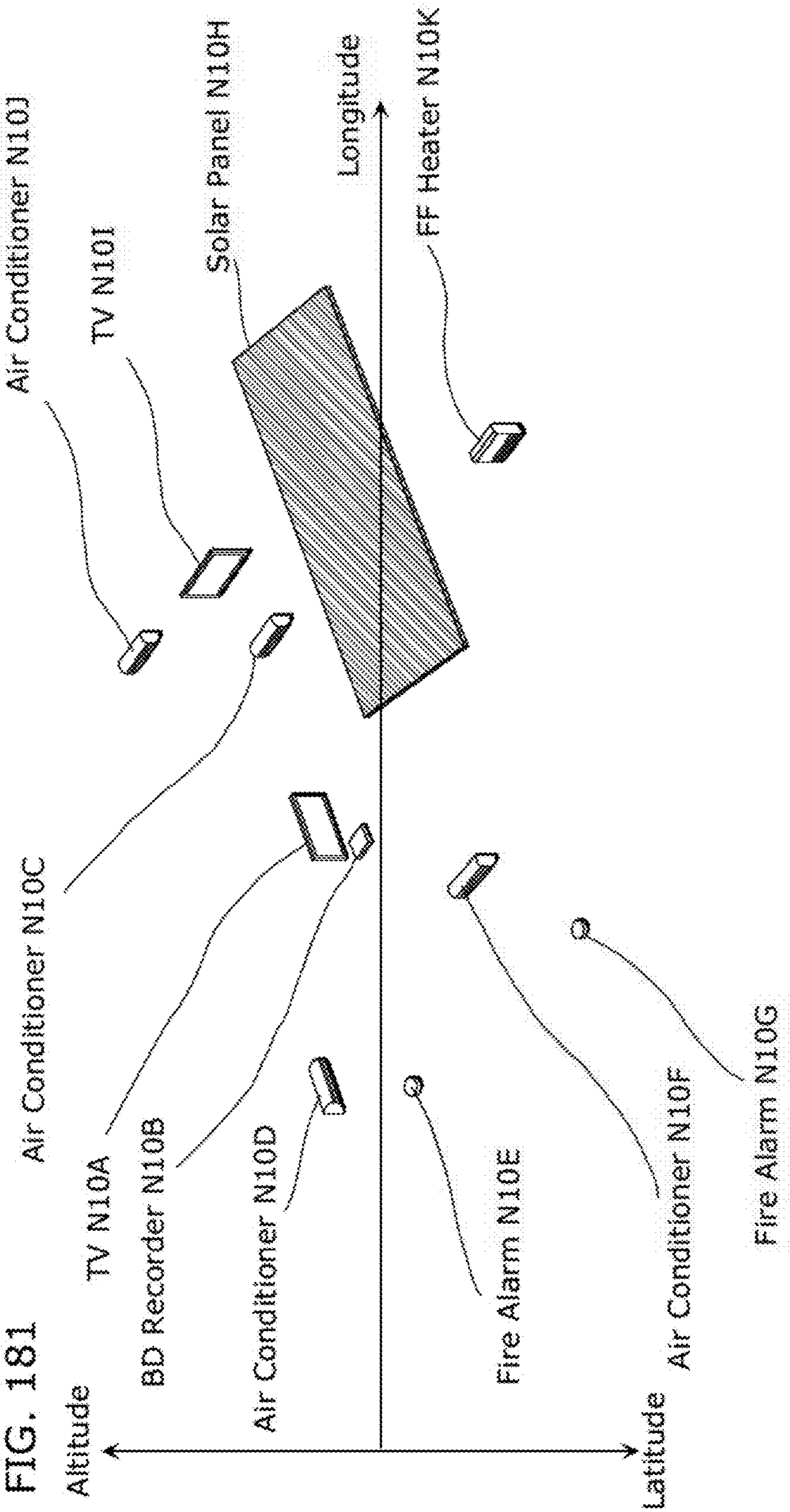

FIG. 181 is a diagram illustrating a product map generated by a position information generation unit N48 according to Embodiment 17 of the present invention.

FIG. 182 is a table illustrating an example of a structure of product information stored in the product information management unit N45 according to Embodiment 17 of the present invention.

Figure 183:
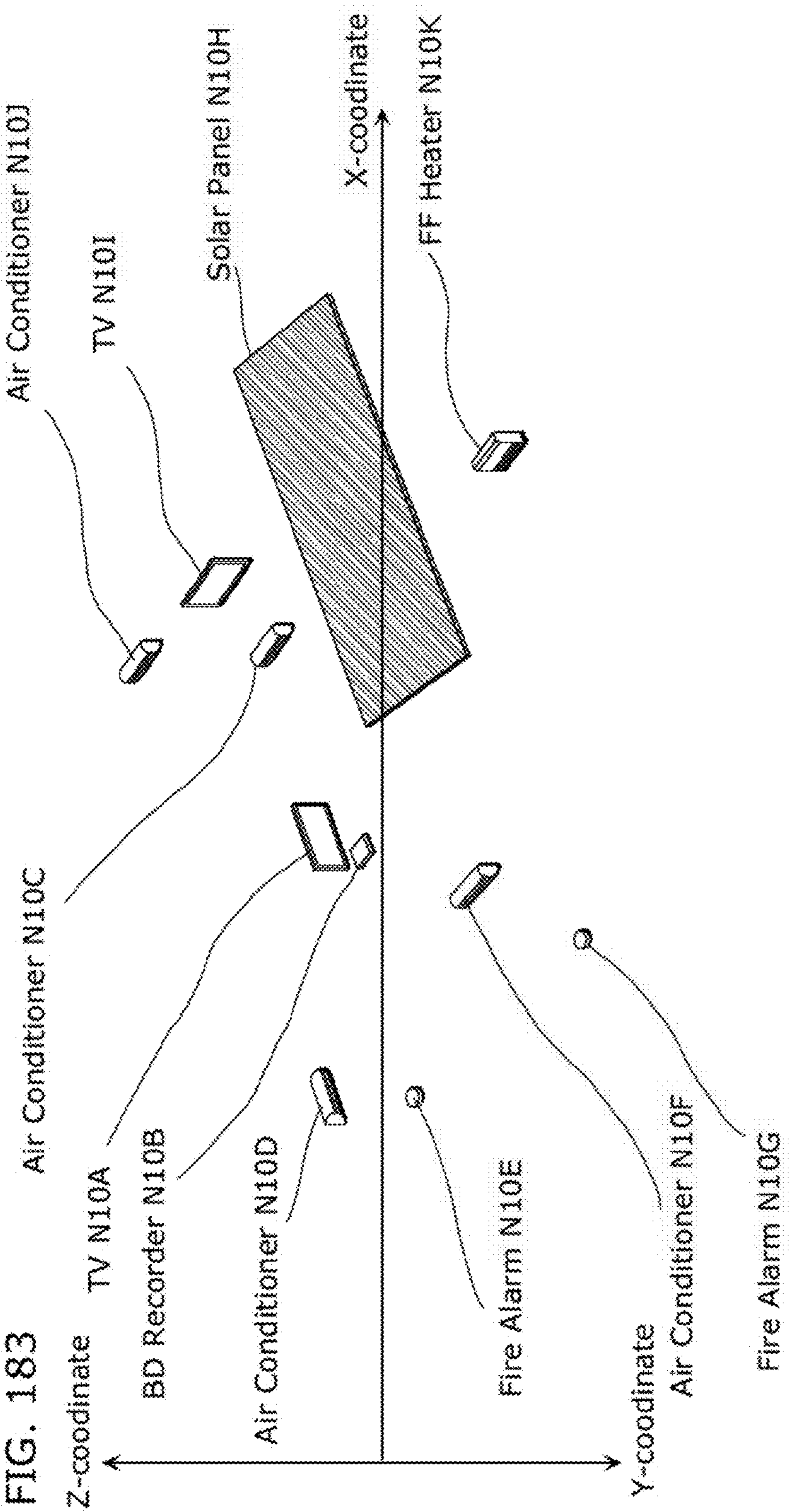

FIG. 183 is a diagram illustrating a product map generated by the position information generation unit N48 according to Embodiment 17 of the present invention.

FIG. 184 is a table illustrating examples of an accuracy identifier according to Embodiment 17 of the present invention.

Figure 185:
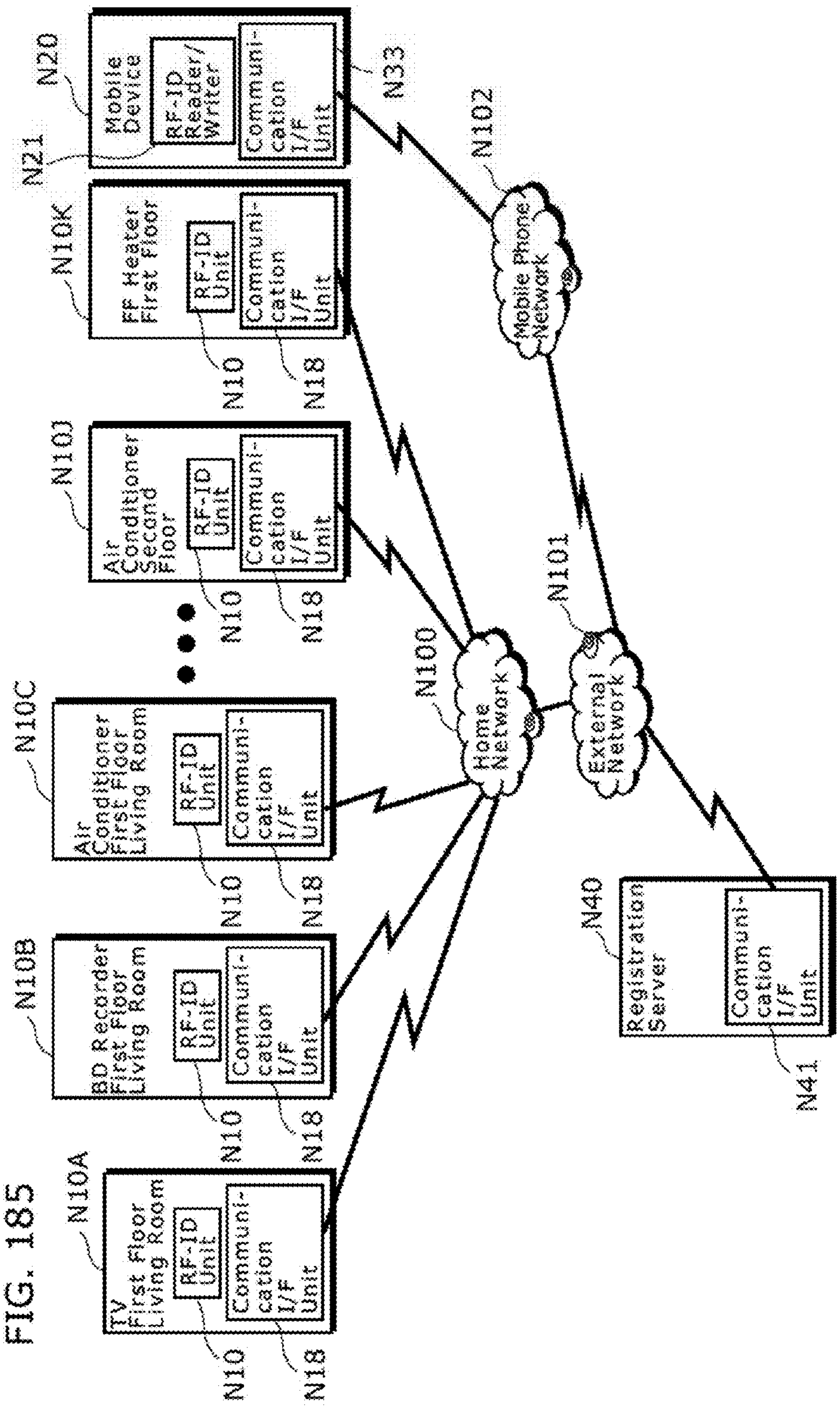

FIG. 185 is a diagram illustrating an example of a system according to Embodiment 17 of the present invention.

Figure 186:
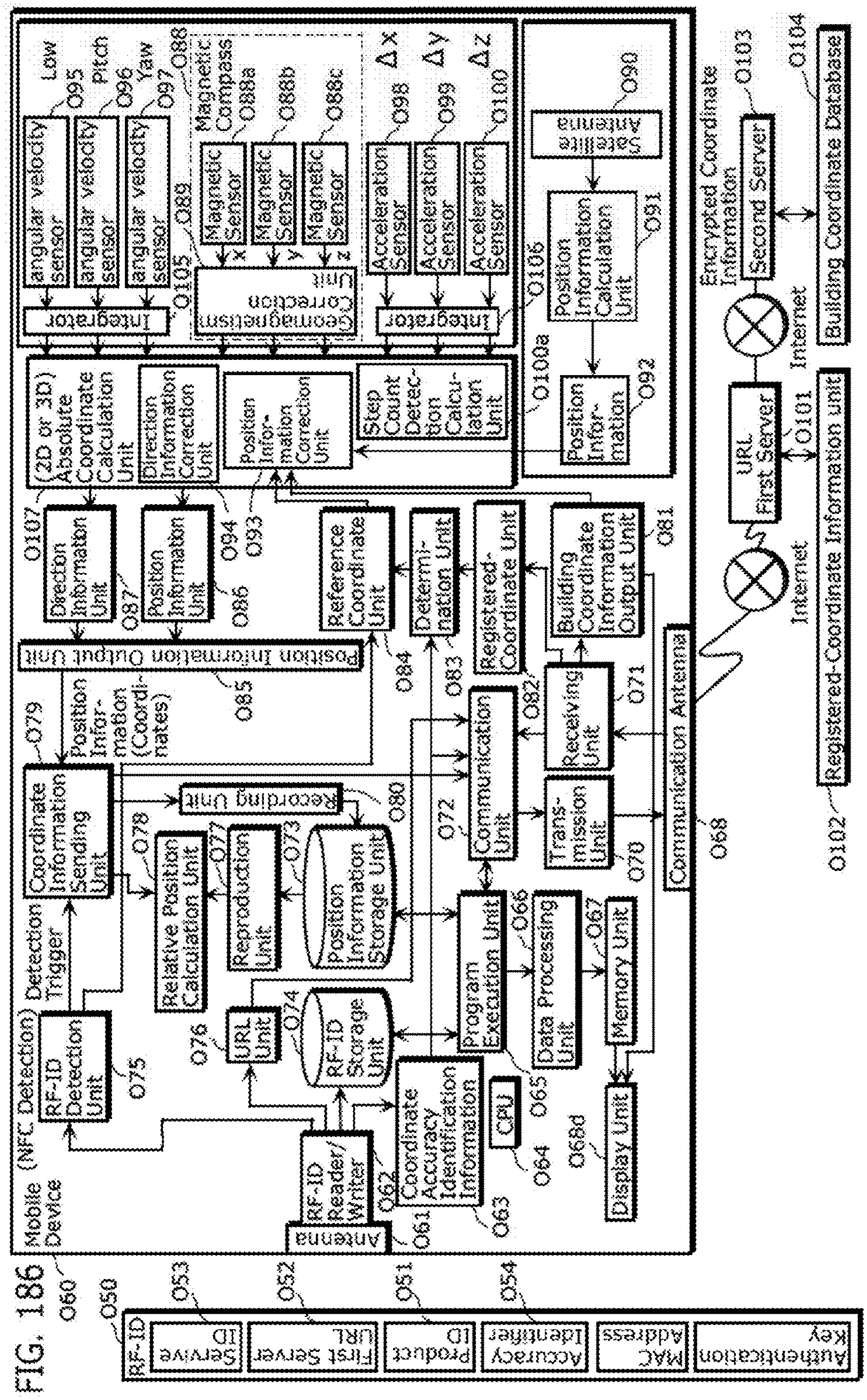

FIG. 186 is a diagram illustrating an example of an entire system according to Embodiment 18 of the present invention.

Figure 187:
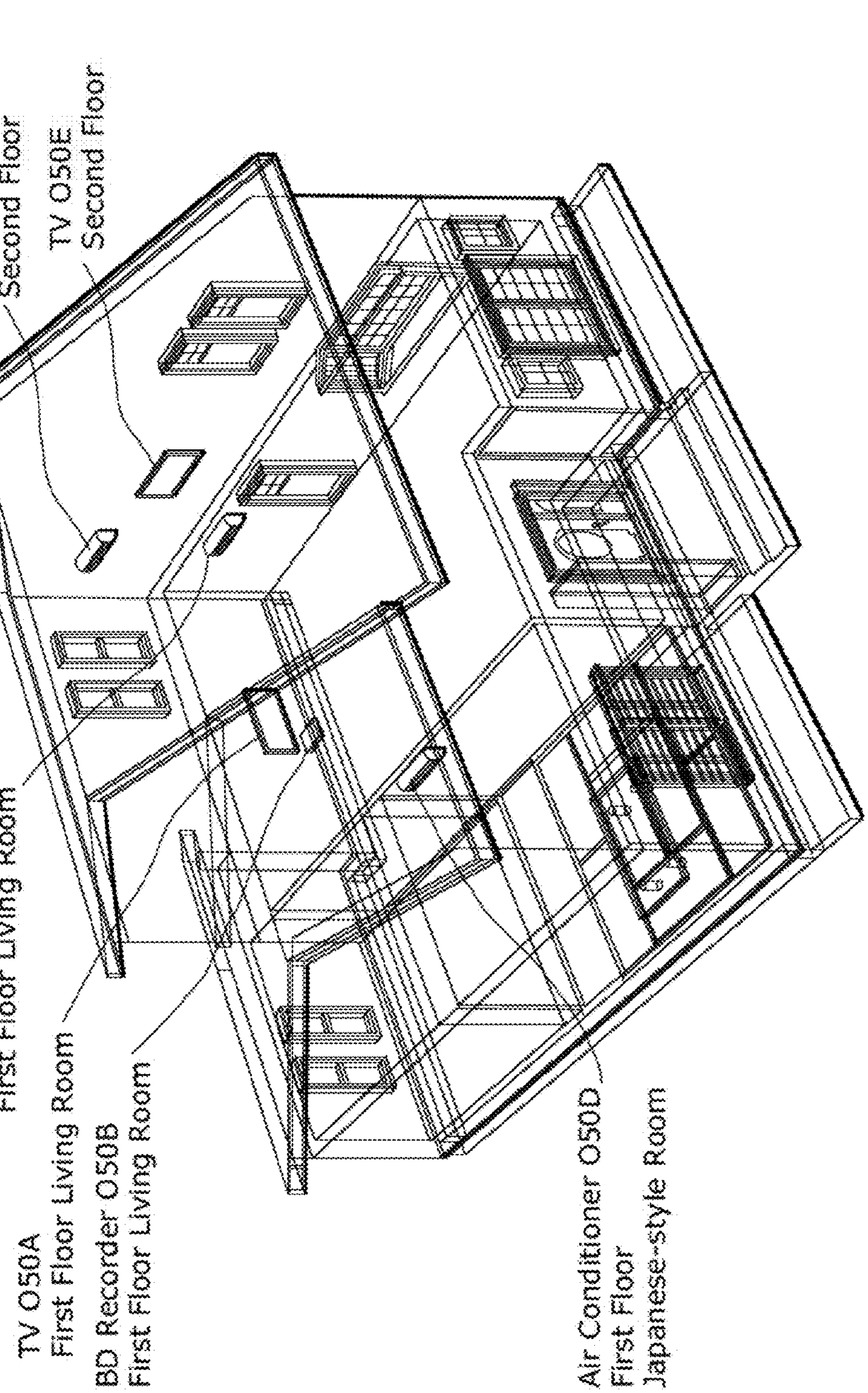

FIG. 187 is a diagram illustrating an example of an arrangement of products embedded with RF-ID units O50 according to Embodiment 18 of the present invention.

Figure 188:
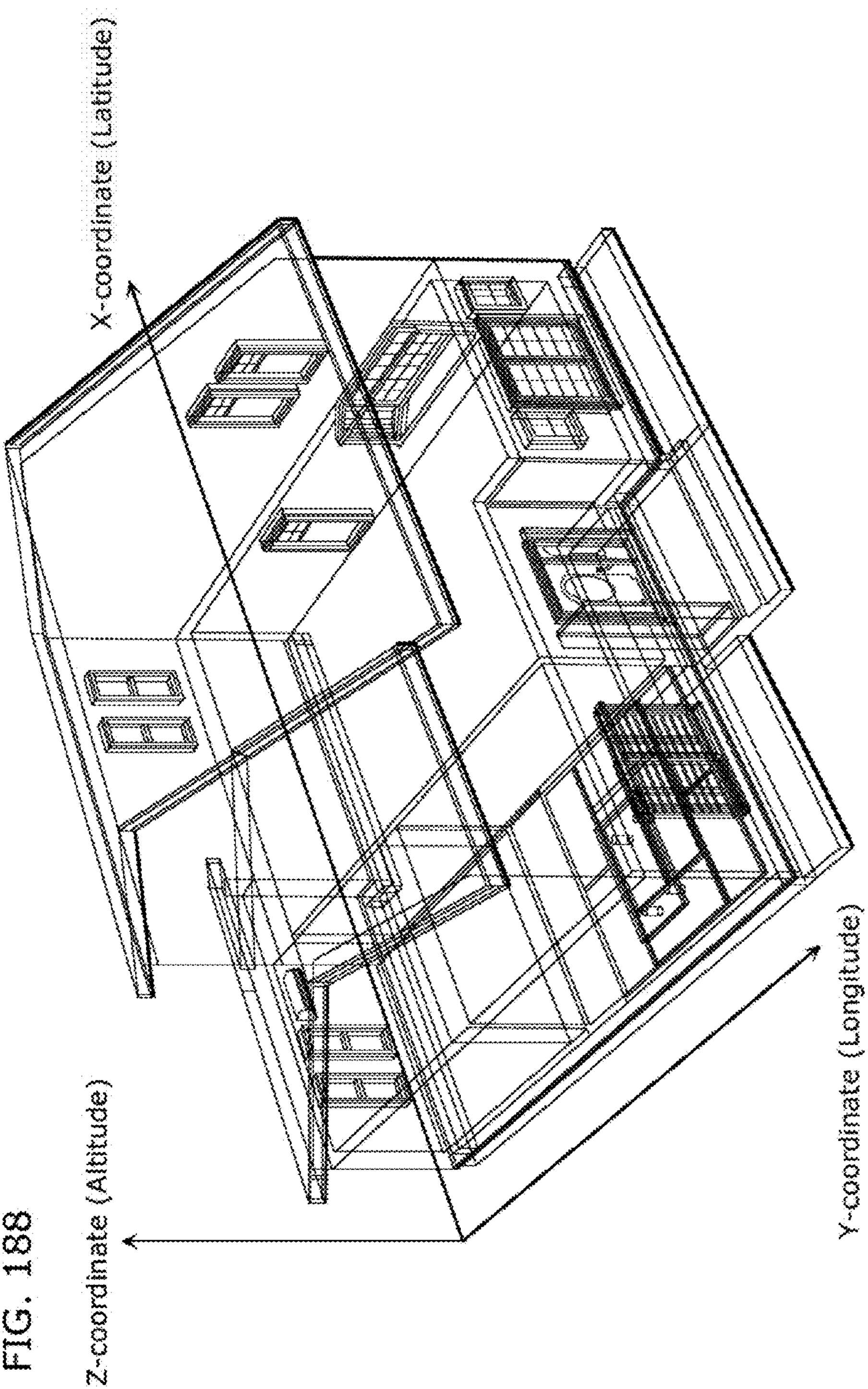

FIG. 188 is a diagram illustrating an example of a three-dimensional (3D) map of a building, which is building coordinate information extracted from a building coordinate database O104 according to Embodiment 18 of the present invention.

Figure 189:
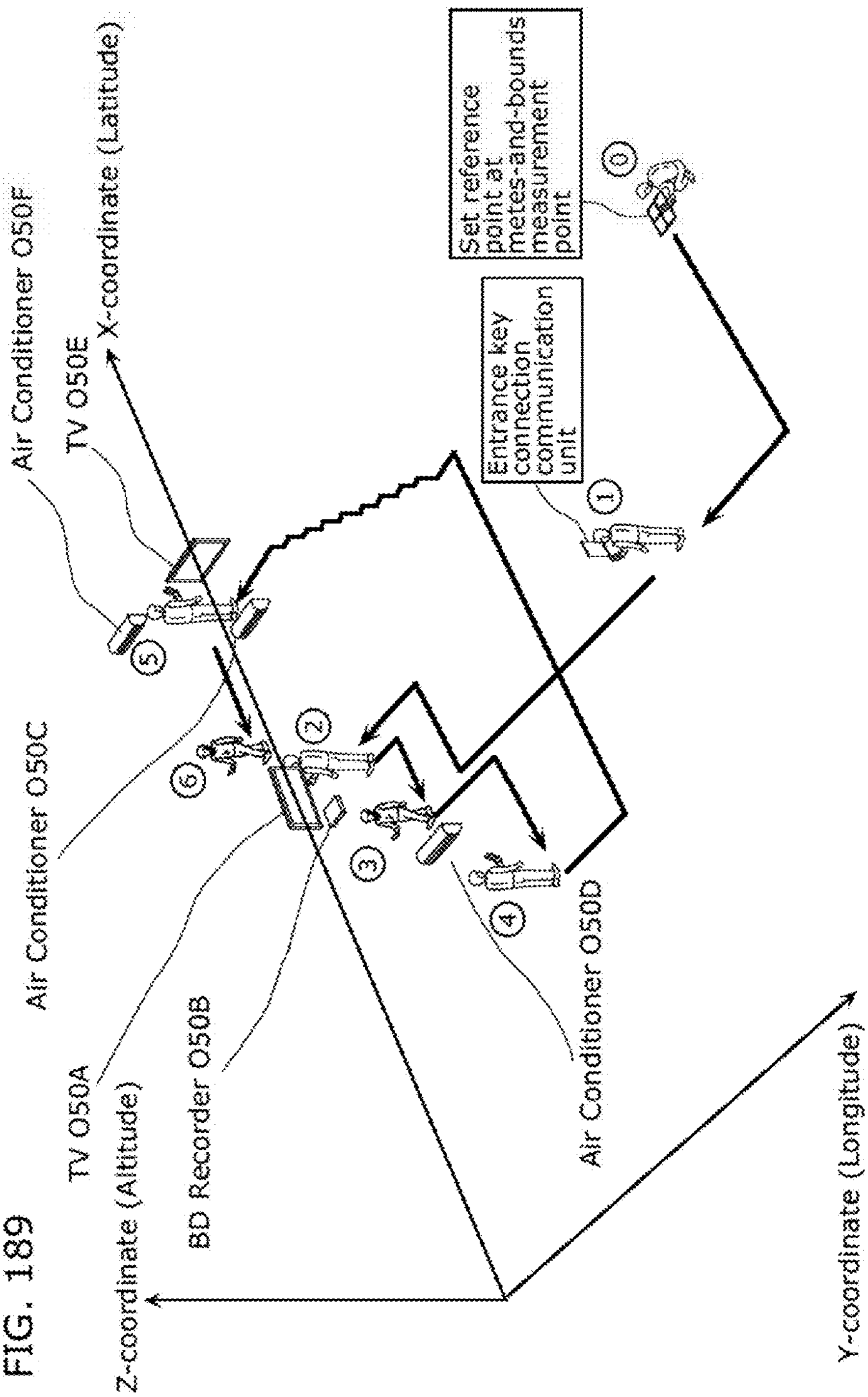

FIG. 189 is a diagram illustrating an example of image data of a 3D map of products which is generated by a program execution unit O65 according to Embodiment 18 of the present invention.

Figure 190:
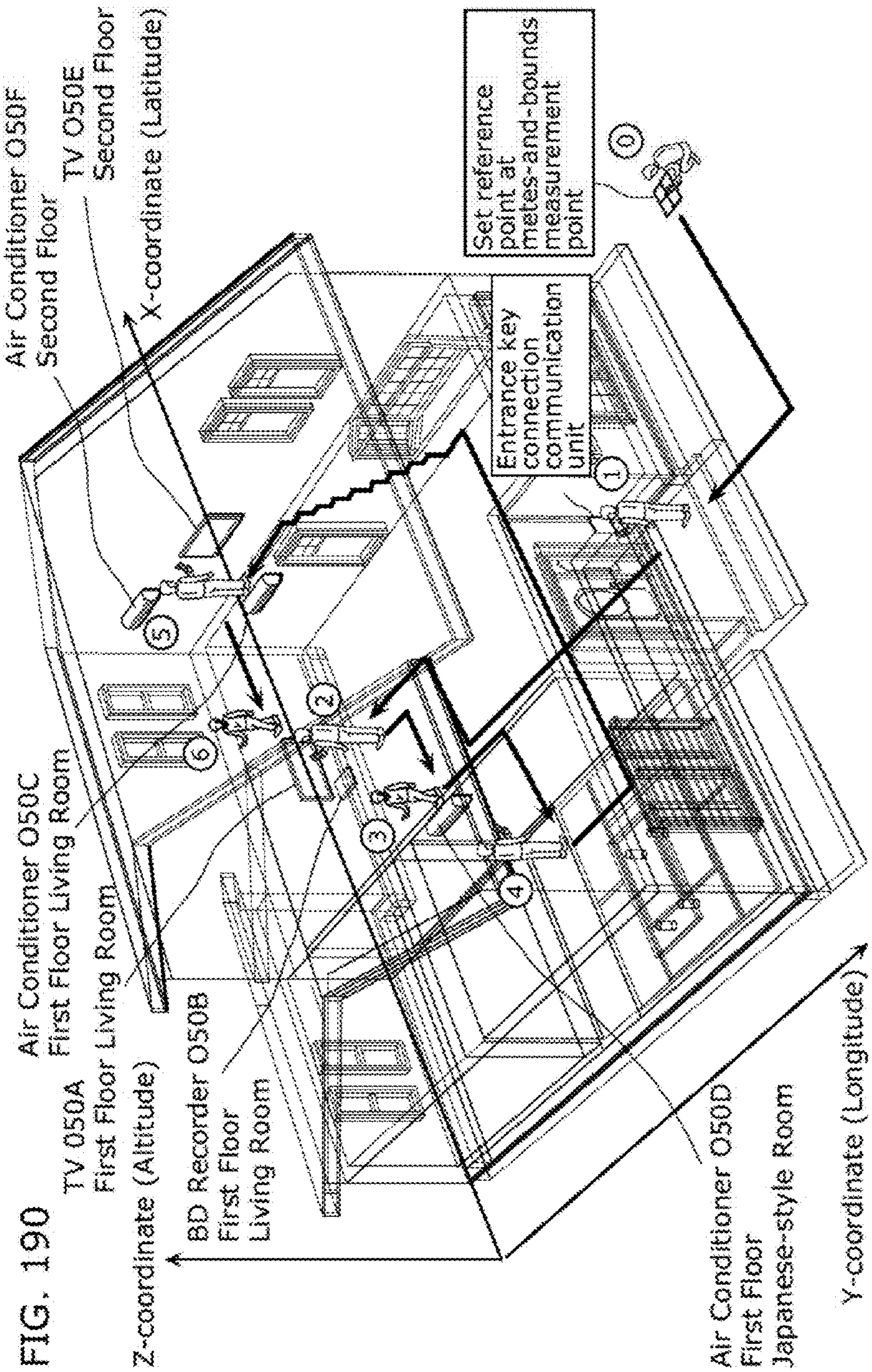

FIG. 190 is a diagram illustrating an example of a 3D product map in which image data of FIG. 151 is combined with the already-displayed image data of FIG. 152 by a display unit O68 according to Embodiment 18 of the present invention.

FIG. 191 is a table illustrating examples of an accuracy identifier according to Embodiment 18 of the present invention.

Figure 192:
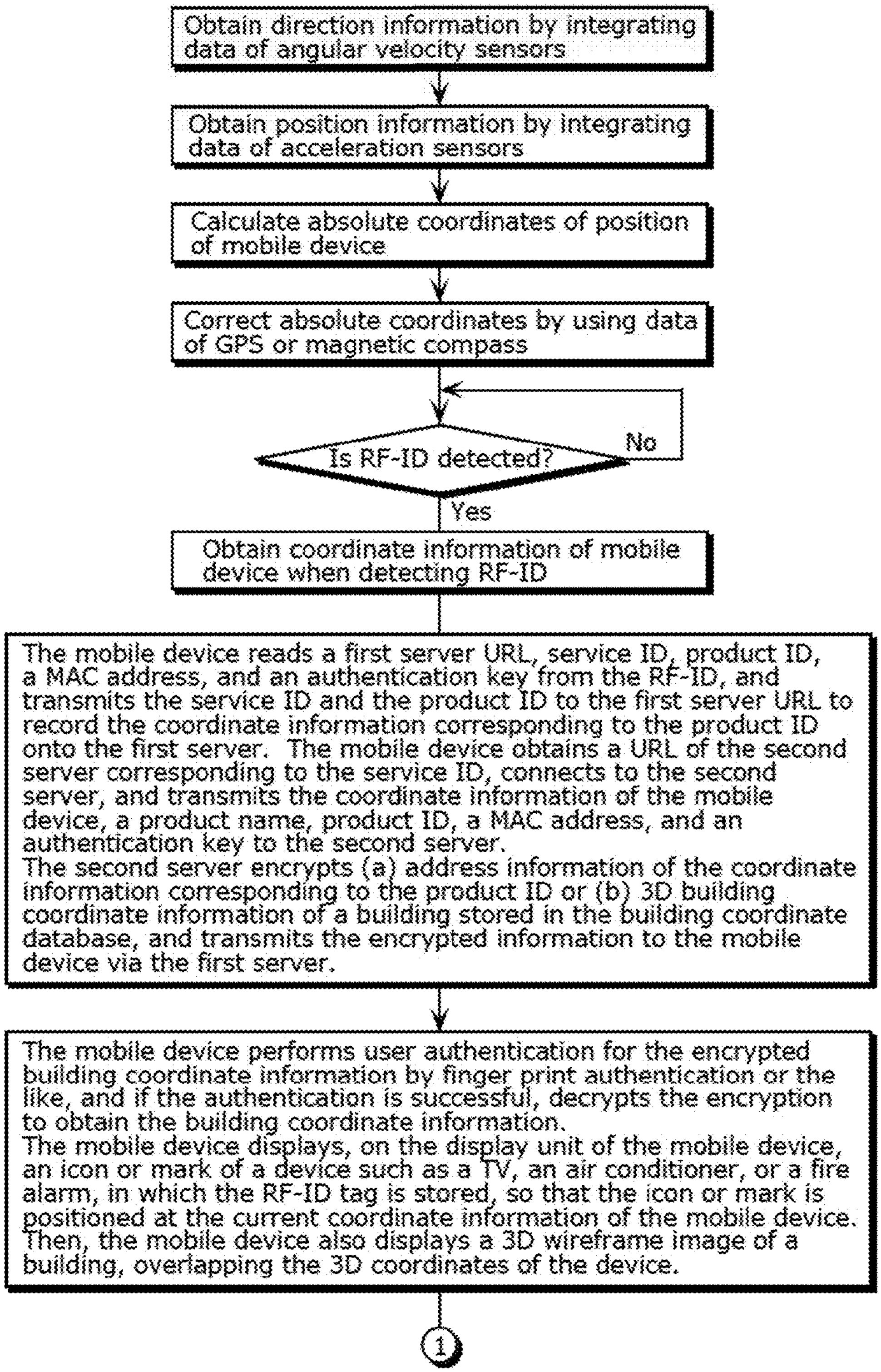

FIG. 192 is a flowchart illustrating an example of processing for the 3D map according to Embodiment 18 of the present invention.

FIG. 193 is a flowchart illustrating an example of processing for the 3D map according to Embodiment 18 of the present invention.

Figure 194:
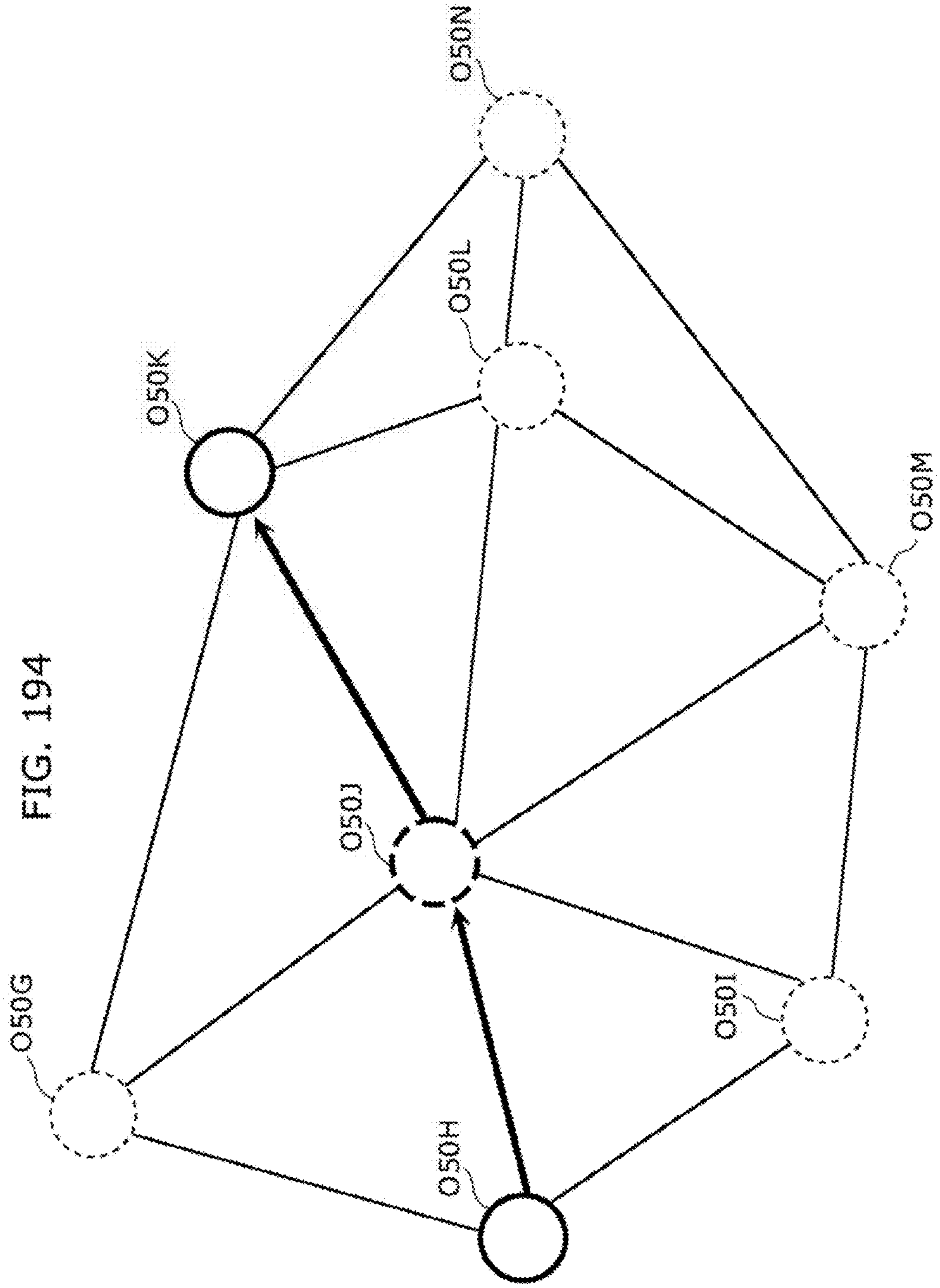

FIG. 194 is a diagram illustrating an example of a specific small power wireless communication system using the 3D map according to Embodiment 18 of the present invention.

Figure 195:
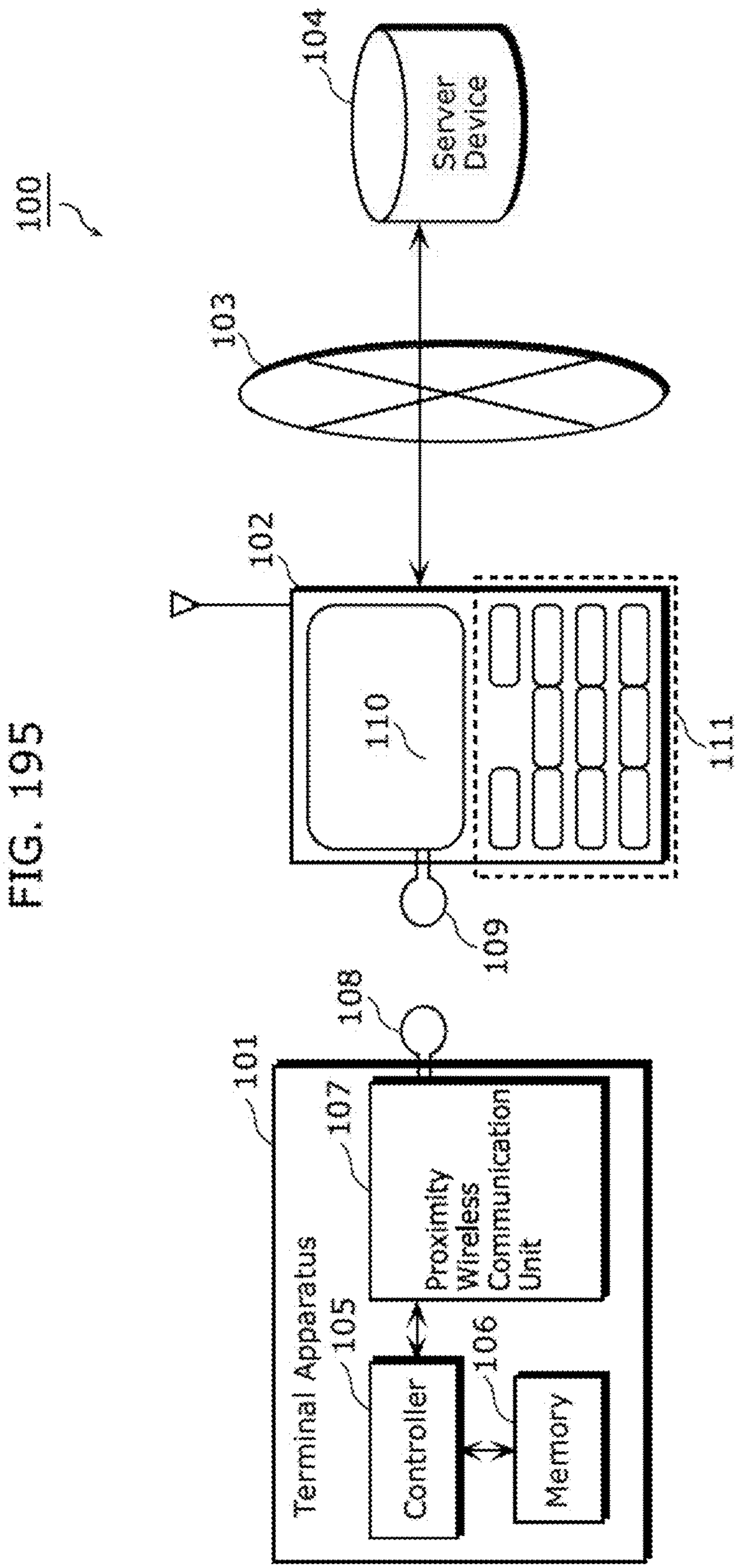

FIG. 195 is a schematic diagram showing an overall communication system according to Embodiment 19 of the present invention.

Figure 196:
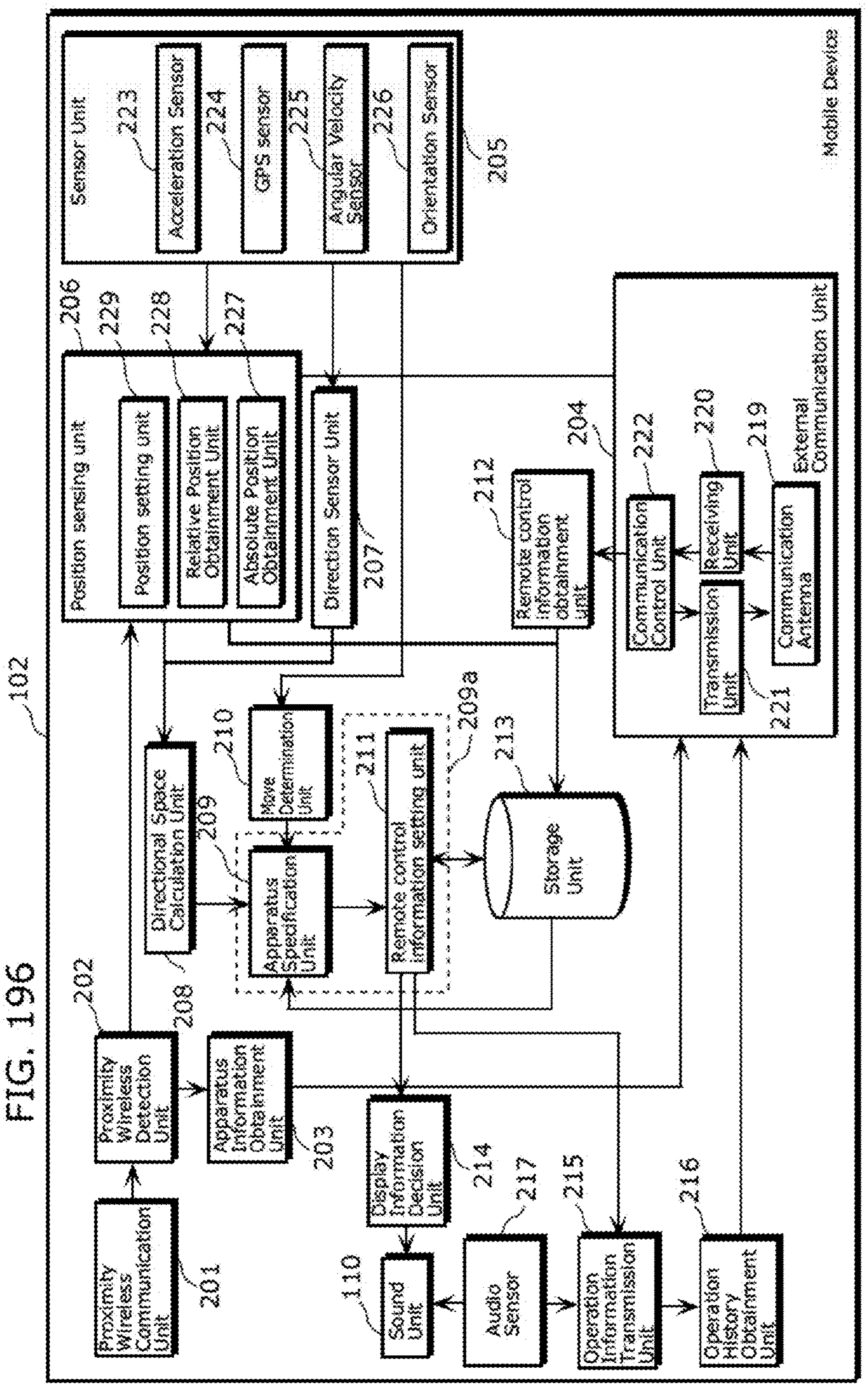

FIG. 196 is a block diagram showing a structure of a mobile device 102 according to Embodiment 19 of the present invention.

Figure 197:
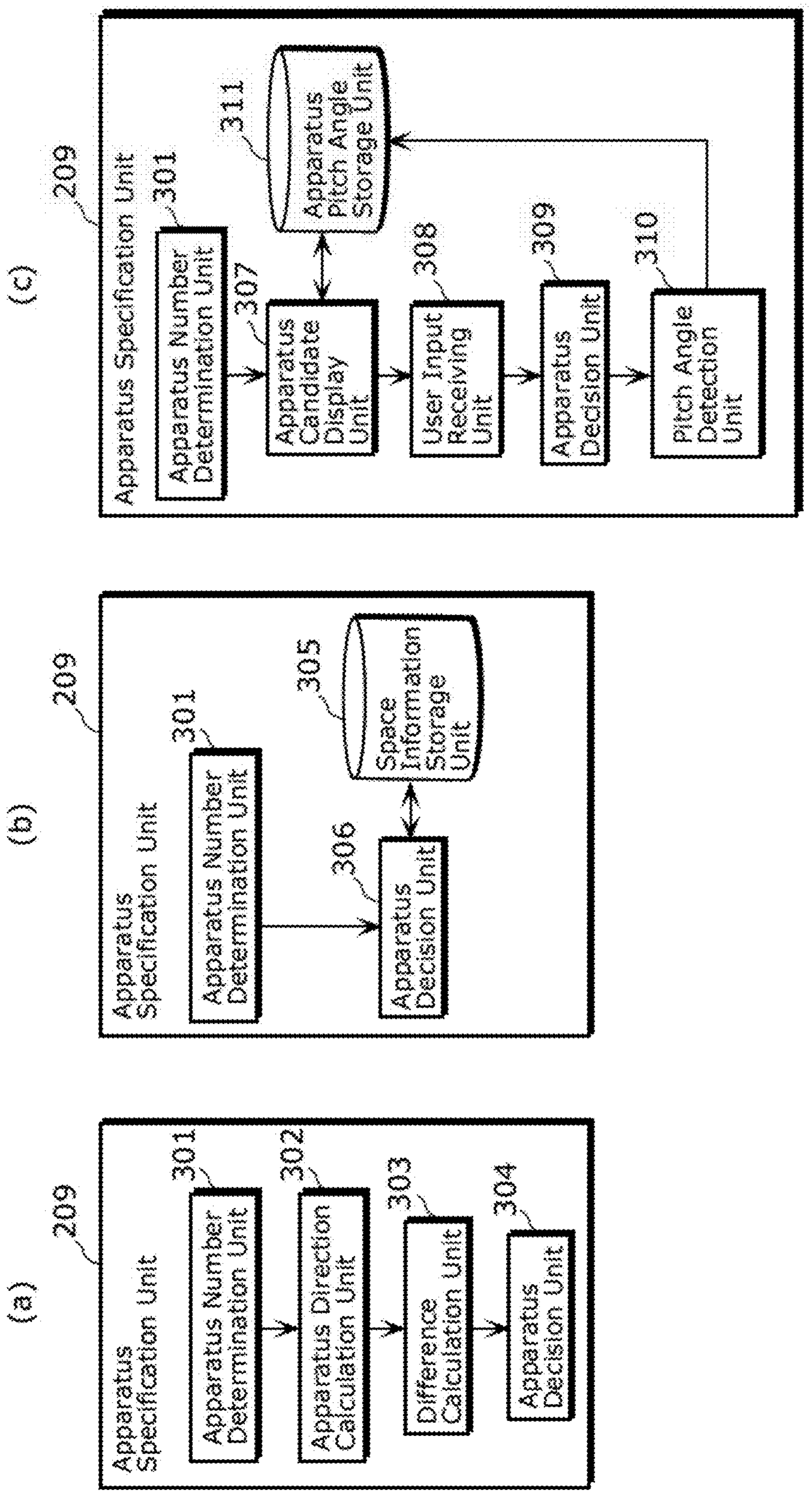

FIG. 197 is a block diagram showing a structure of an apparatus specification unit 209 according to Embodiment 19 of the present invention.

FIG. 198 is a table showing an example of a data structure of a storage unit 213 according to Embodiment 19 of the present invention.

Figure 199:
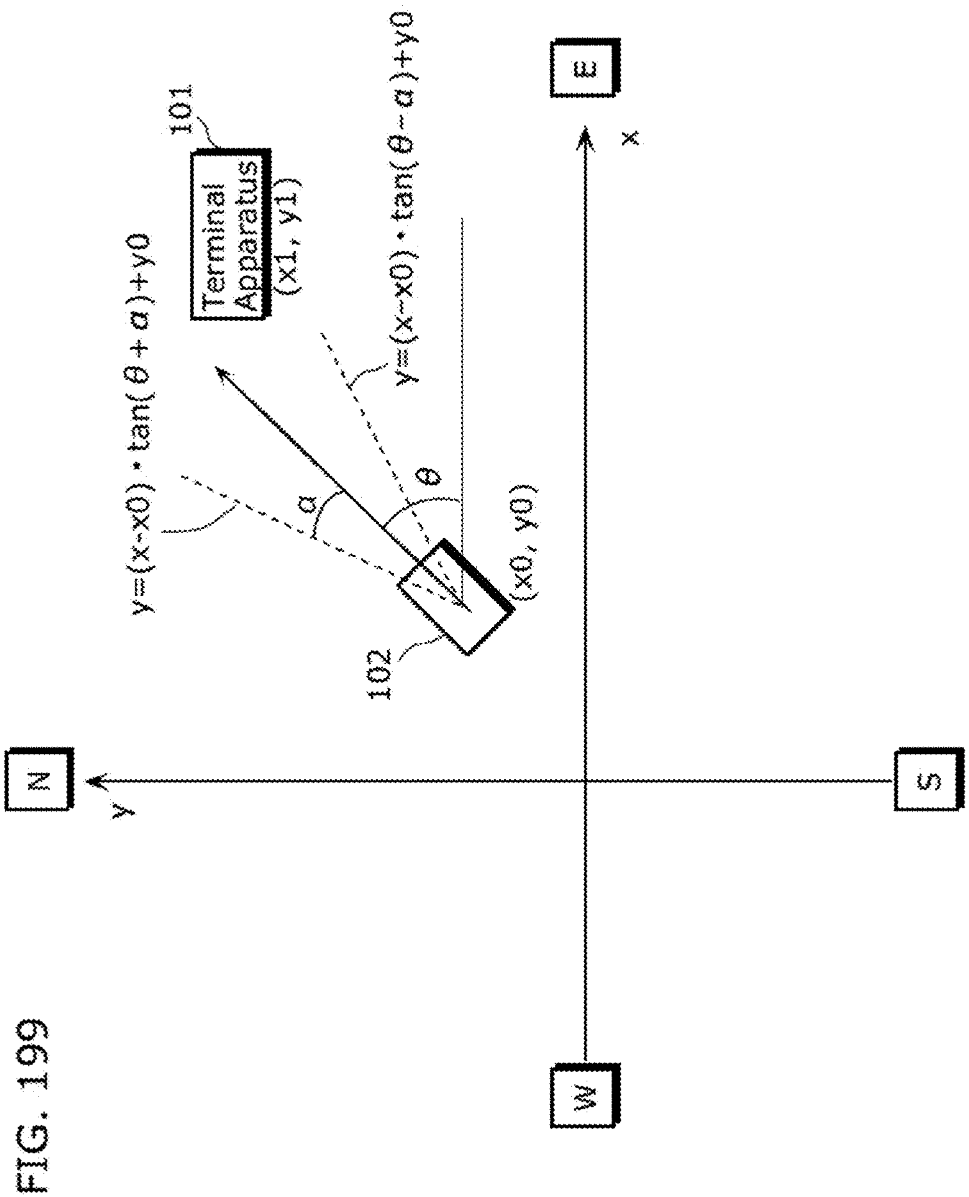

FIG. 199 is a graph showing an example of a method of calculating a directional space by a directional space calculating unit 208 according to Embodiment 19 of the present invention.

Figure 200:
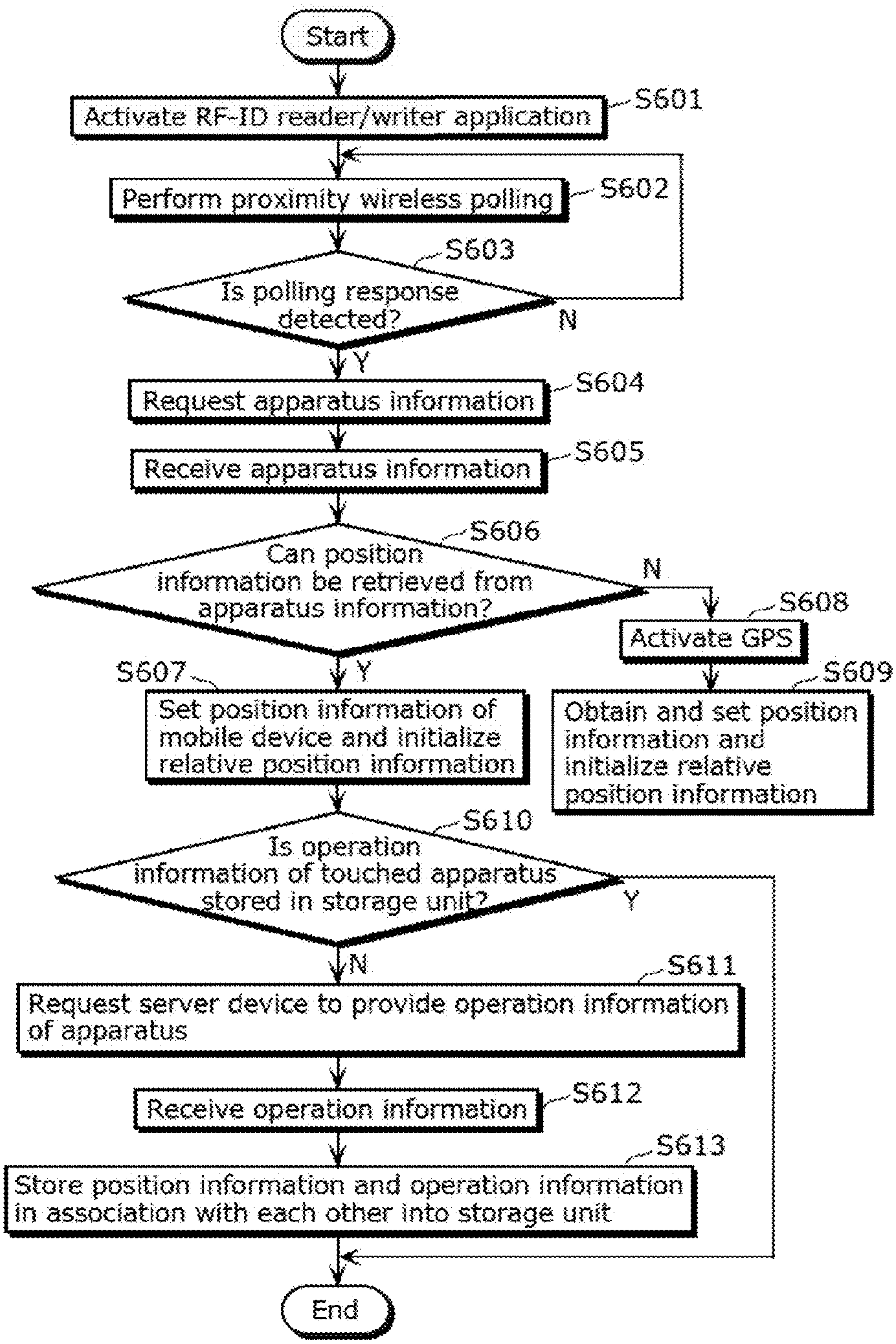

FIG. 200 is a flowchart of a flow of processing of registering remote control information to the storage unit 213 of the mobile device 102 according to Embodiment 19 of the present invention.

Figure 201A:
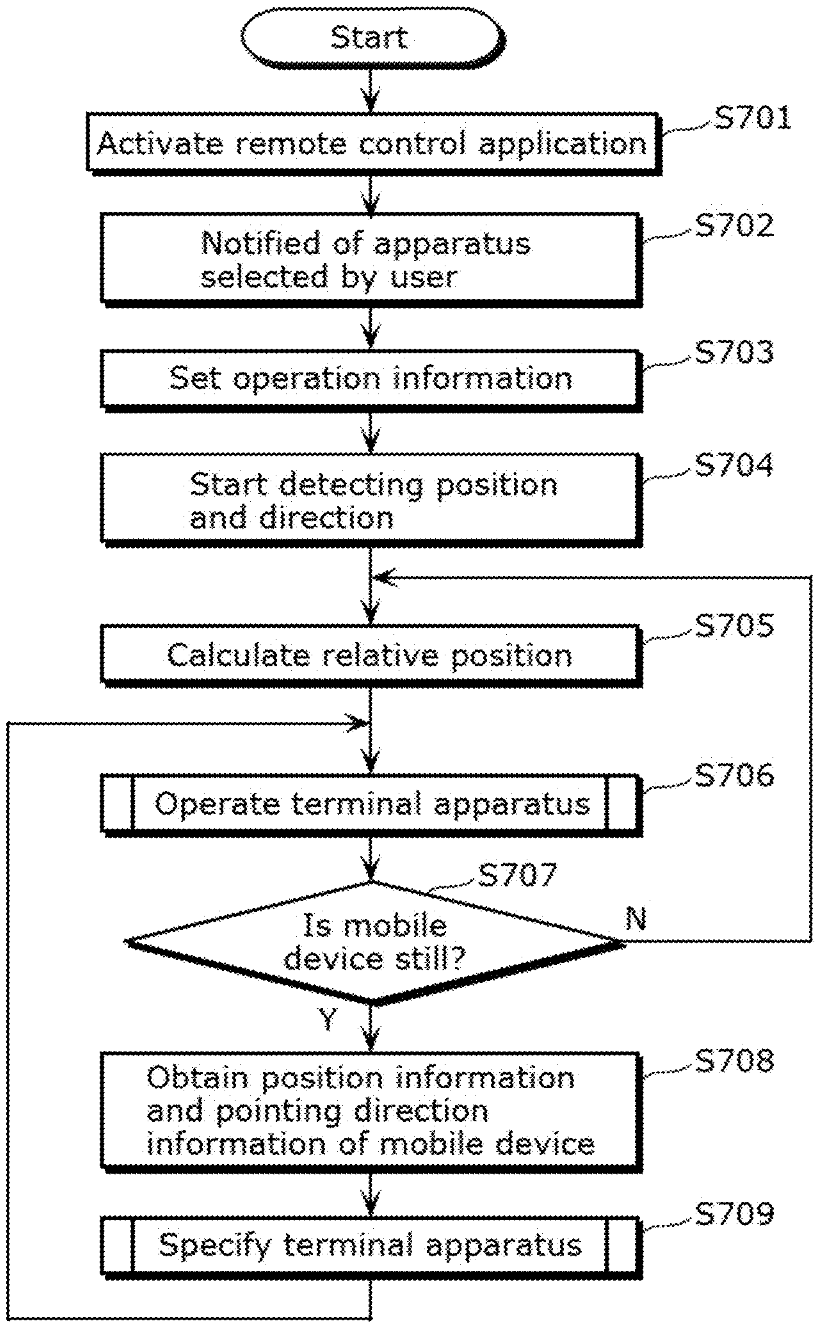

FIG. 201A is a flowchart of a flow of processing of setting remote control information in the mobile device 102 and operating the mobile device 102 as a remote controller in the case where an application is activated by a user according to Embodiment 19 of the present invention.

Figure 201B:
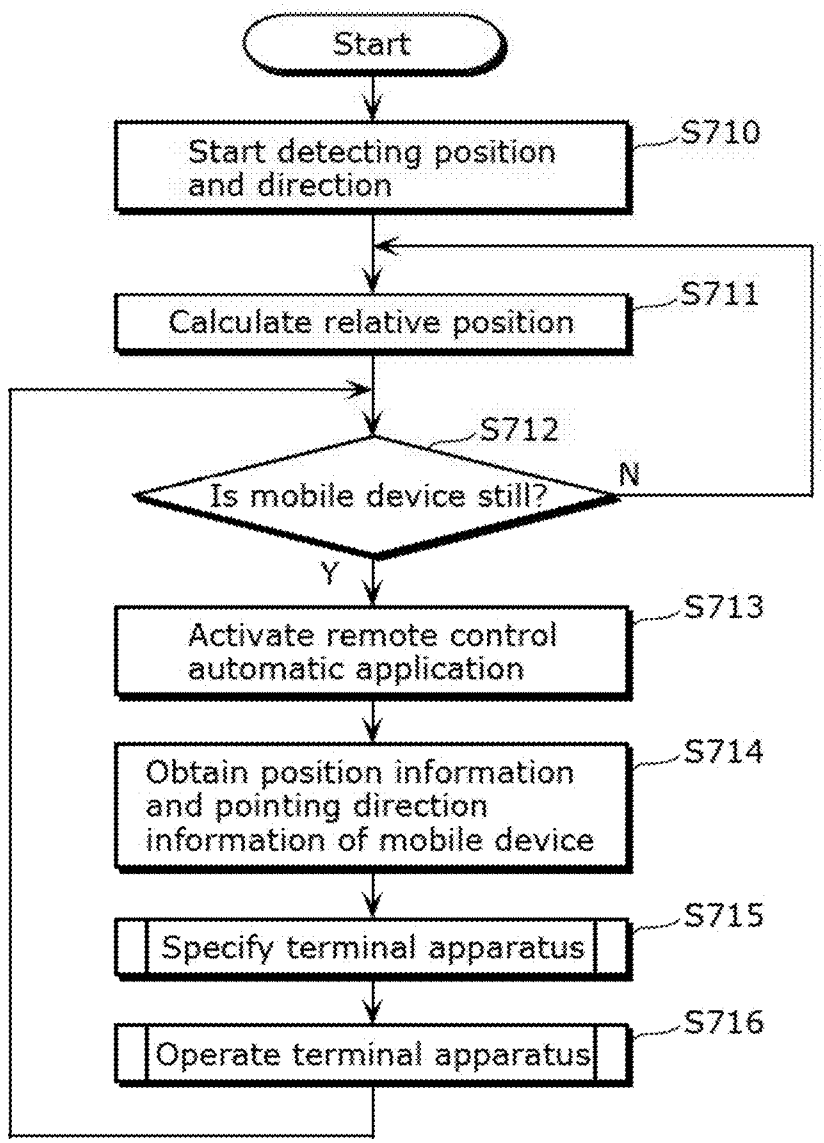

FIG. 201B is a flowchart of a flow of processing of setting remote control information in the mobile device 102 and operating the mobile device 102 as a remote controller in the case where an application is activated automatically according to Embodiment 19 of the present invention.

Figure 202:
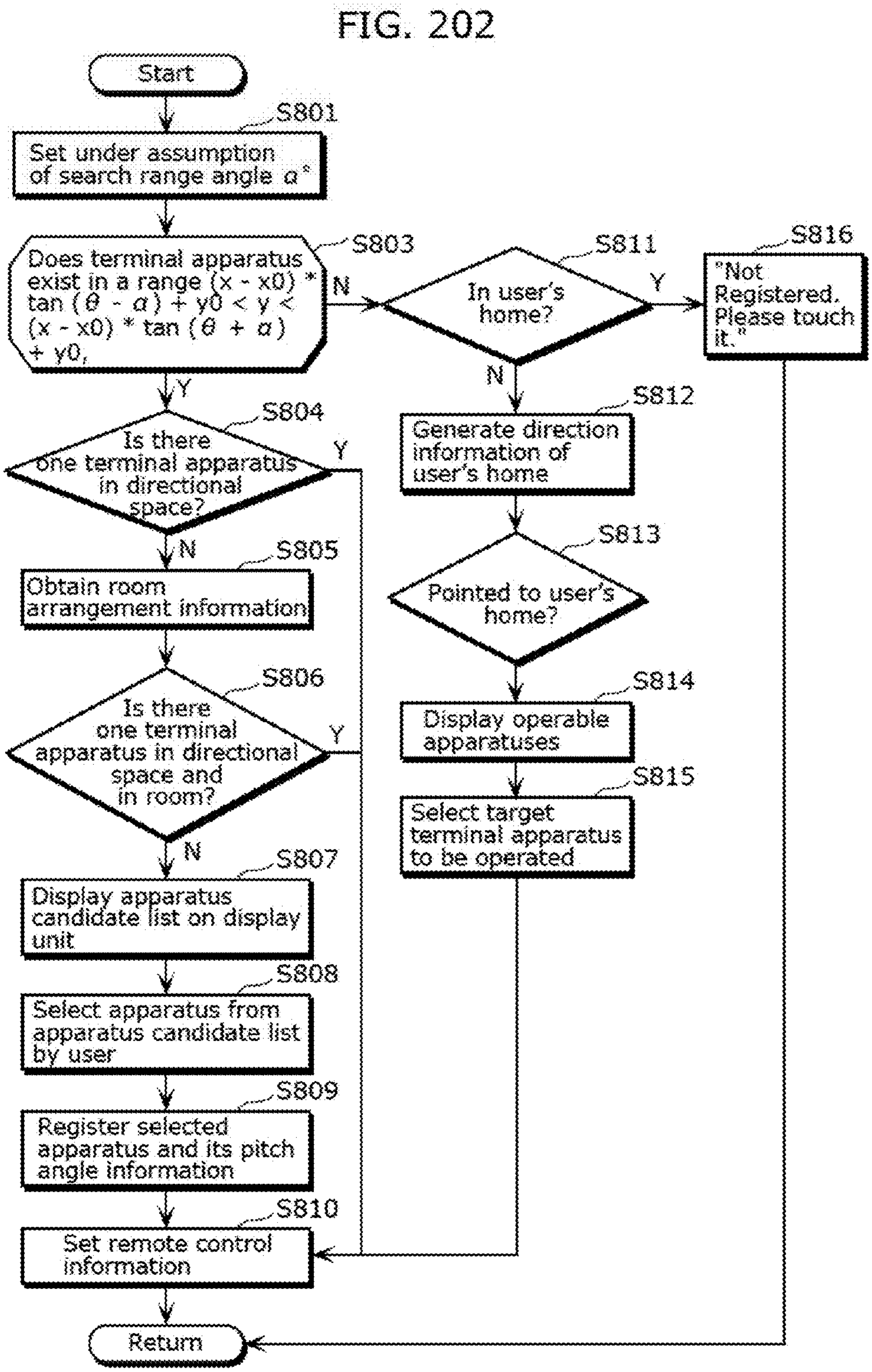

FIG. 202 is a flowchart of a flow of processing of specifying a terminal apparatus 101 existing in a direction pointed by the mobile device 102 according to Embodiment 19 of the present invention.

Figure 203:
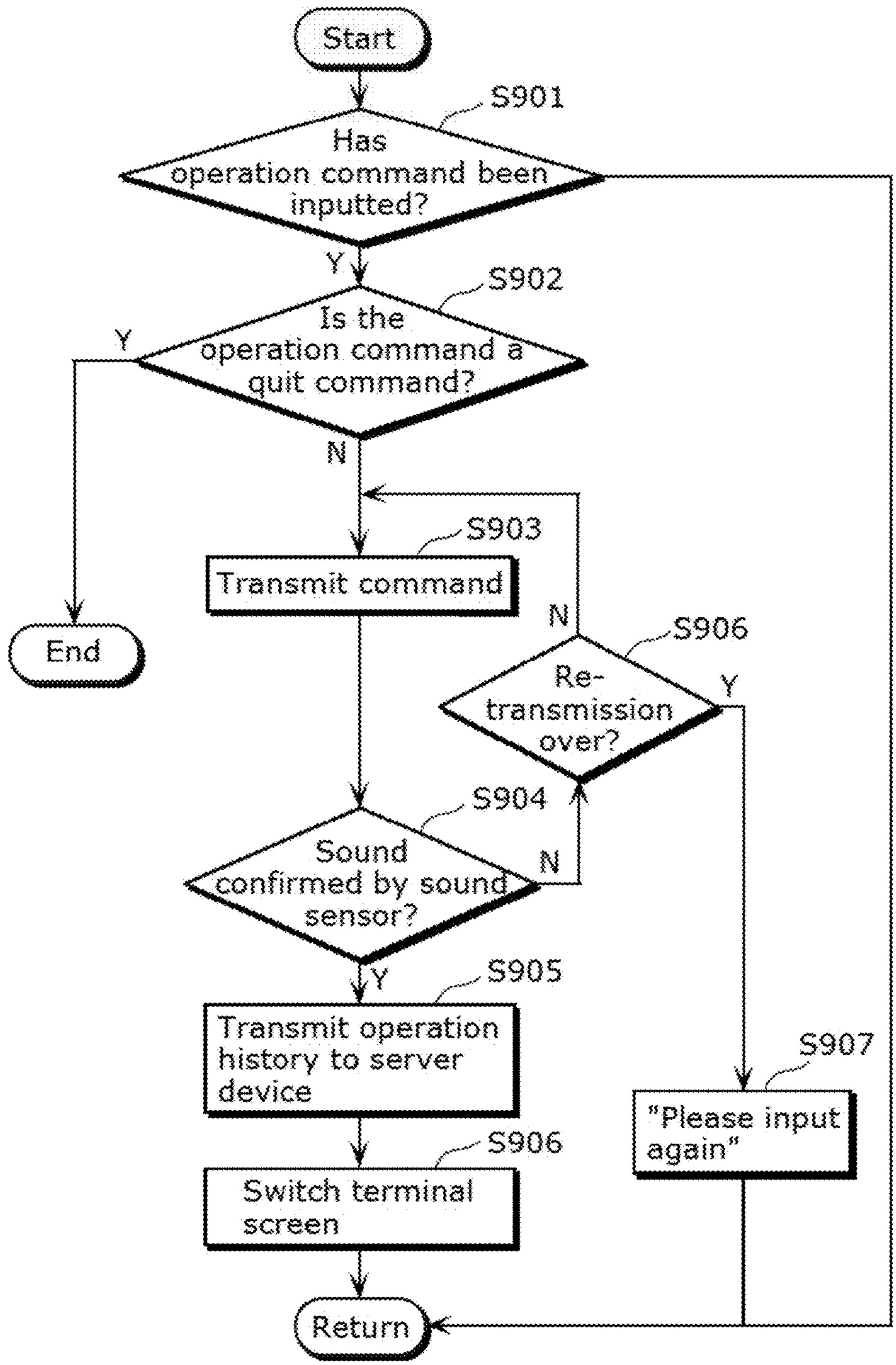

FIG. 203 is a flowchart of a flow of processing of operating the terminal apparatus 101 by using, as a remote controller, the mobile device 102 according to Embodiment 19 of the present invention.

Figure 204:
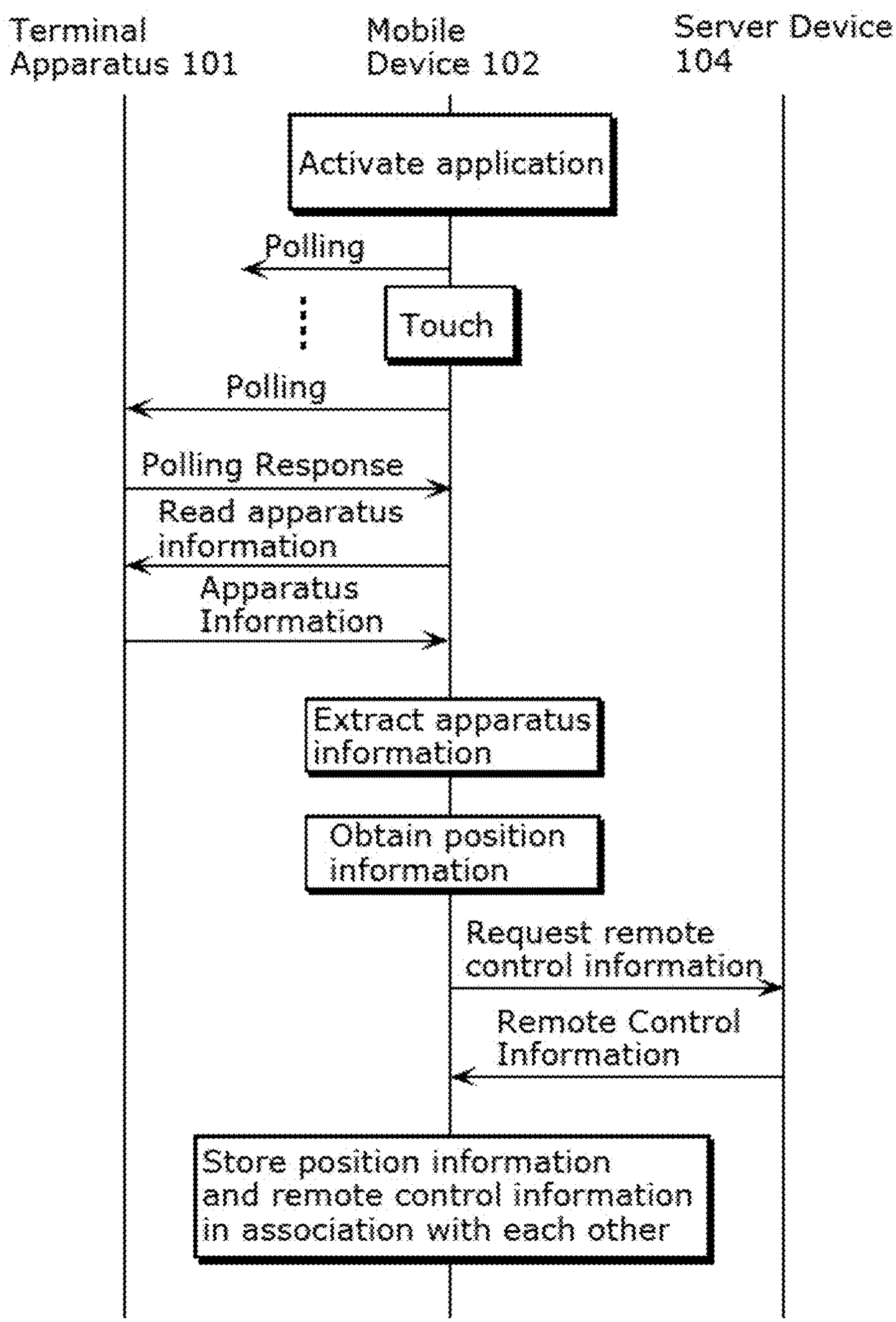

FIG. 204 is a sequence diagram showing data exchange between the terminal apparatus 101, the mobile device 102, and a server device 104 when registering remote control information to the mobile device 102 according to Embodiment 19 of the present invention.

Figure 205:
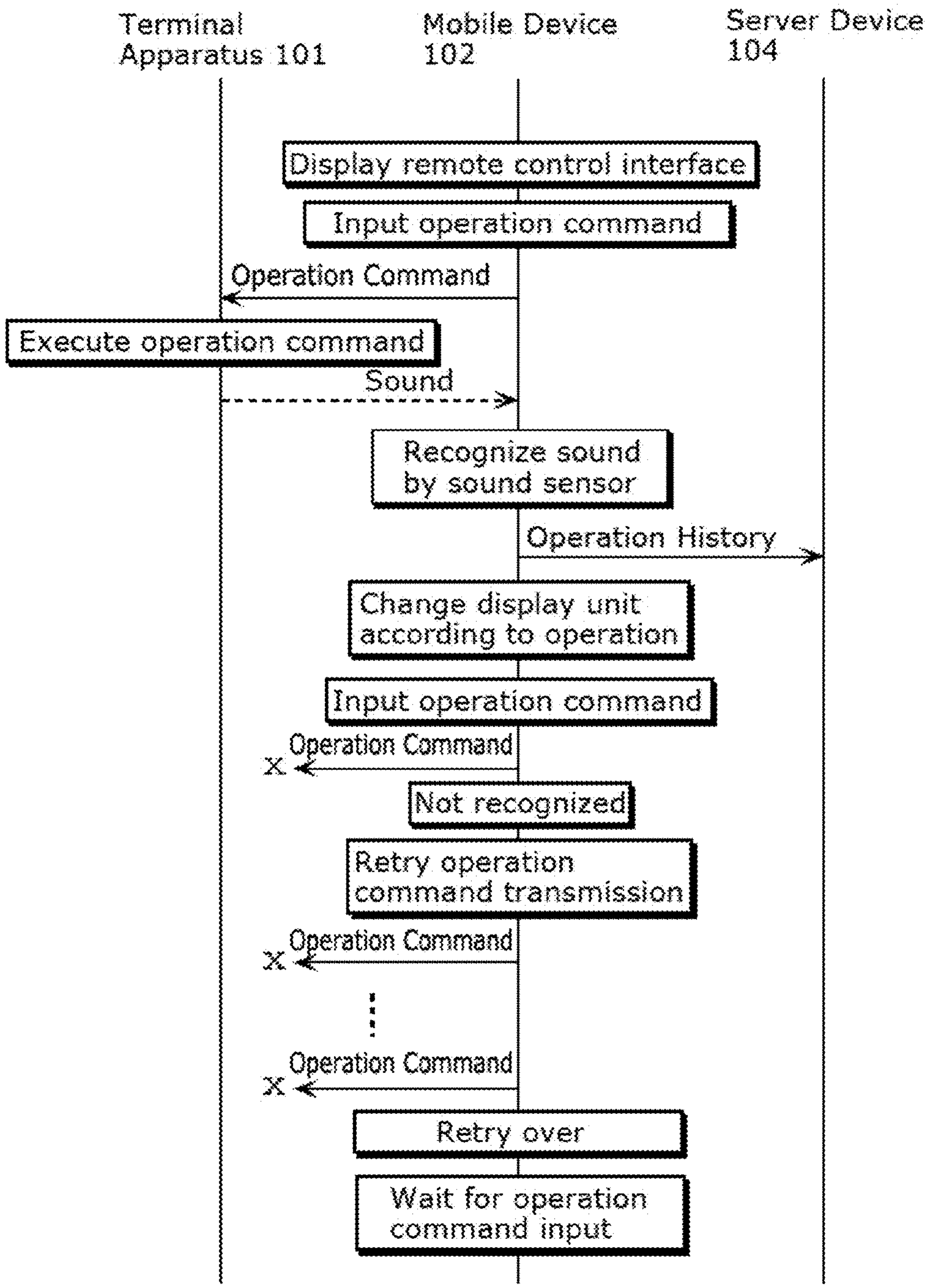

FIG. 205 is a sequence diagram showing data exchange between the terminal apparatus 101, the mobile device 102, and the server device 104 when operating the terminal apparatus 101 using the mobile device 102 as a remote controller according to Embodiment 19 of the present invention.

Figure 206:
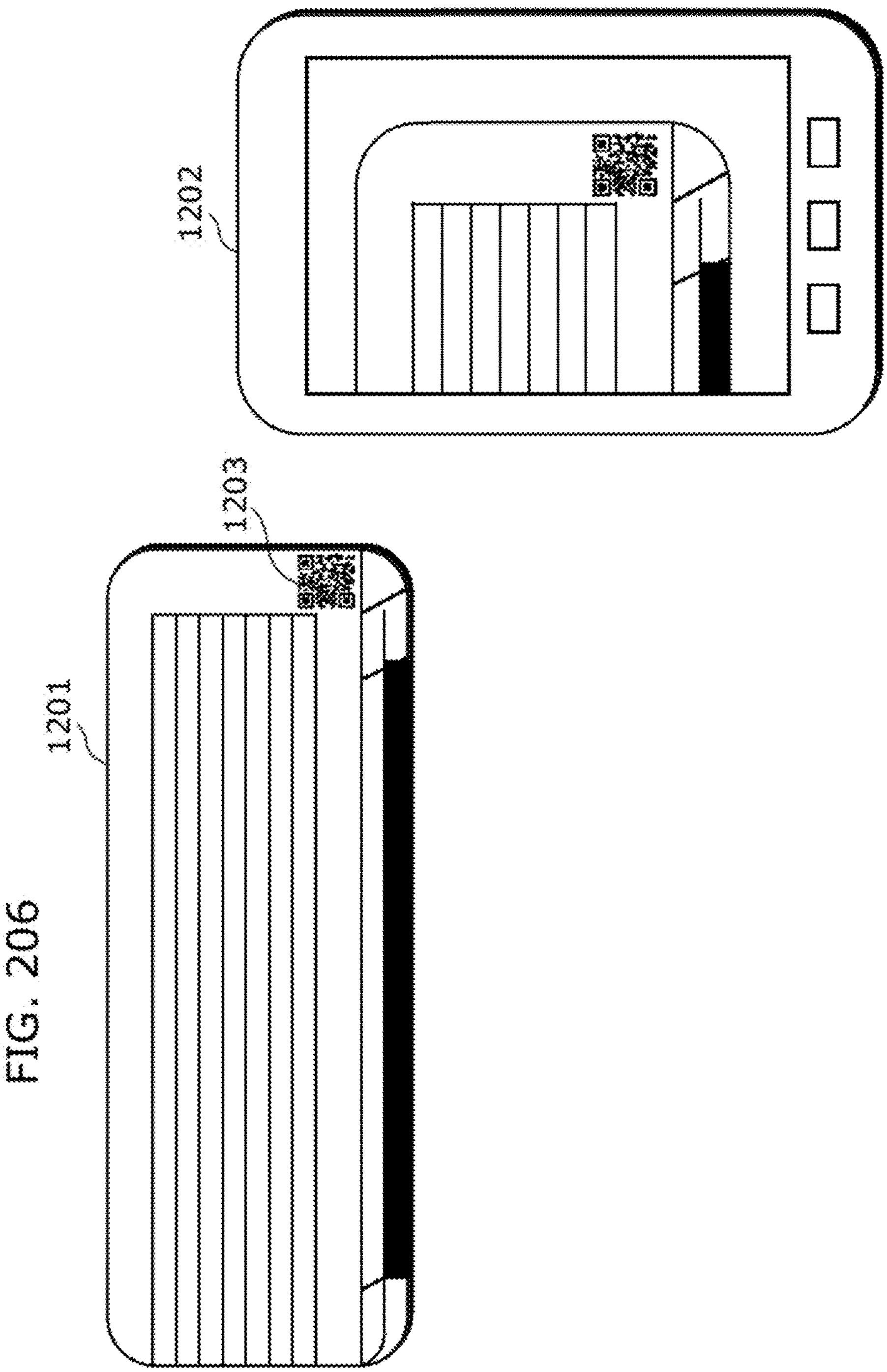

FIG. 206 is a diagram showing an example of reading apparatus information of the terminal apparatus 101 from a bar-code according to Embodiment 19 of the present invention.

Figure 207:
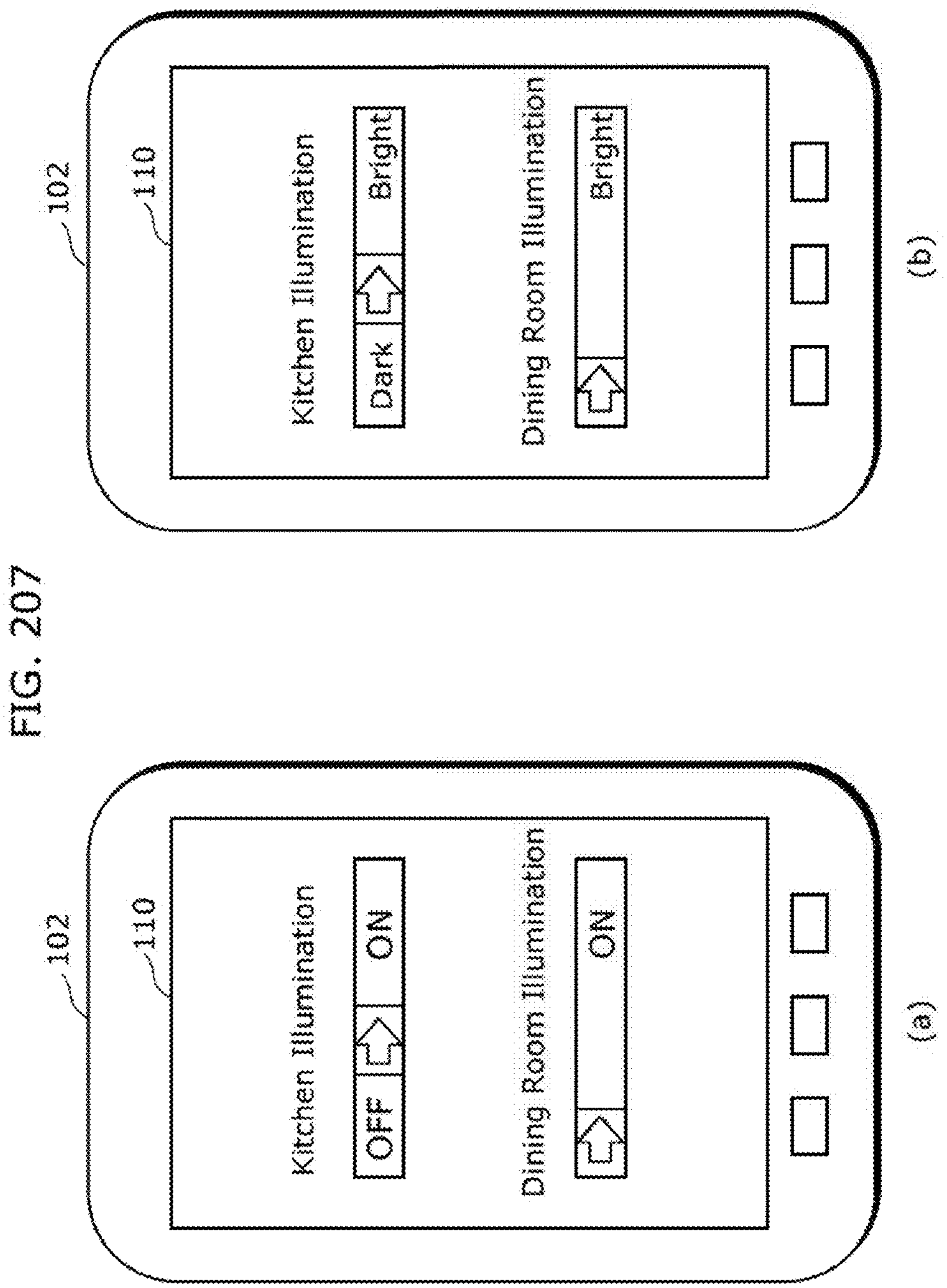

FIG. 207 is a diagram showing an example of operating a plurality of illumination apparatuses (switching between ON and OFF) according to Embodiment 19 of the present invention.

Figure 208:
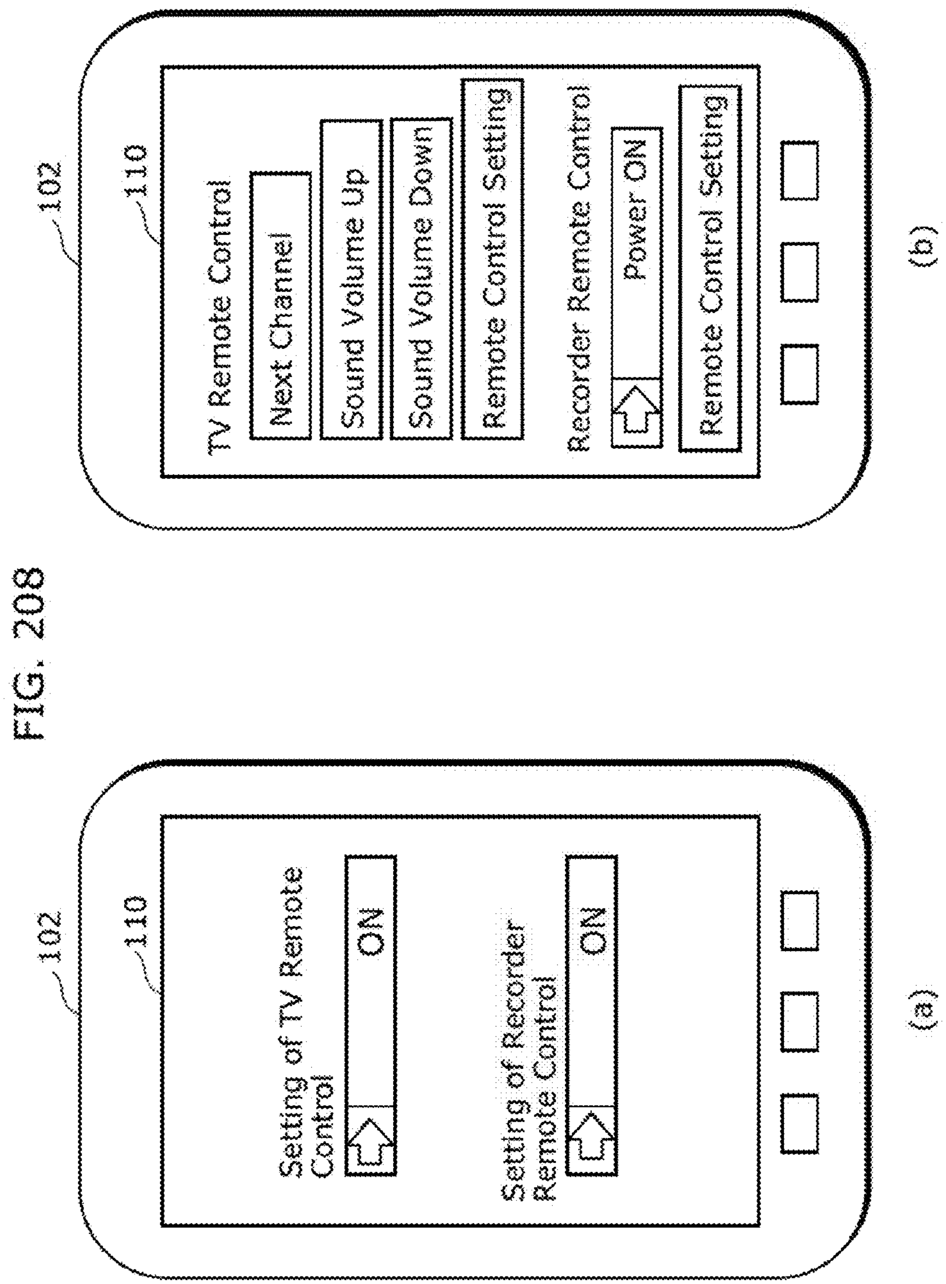

FIG. 208 is a diagram showing a display example in the case of prompting a user to select a television or a recorder according to Embodiment 19 of the present invention.

Figure 209:
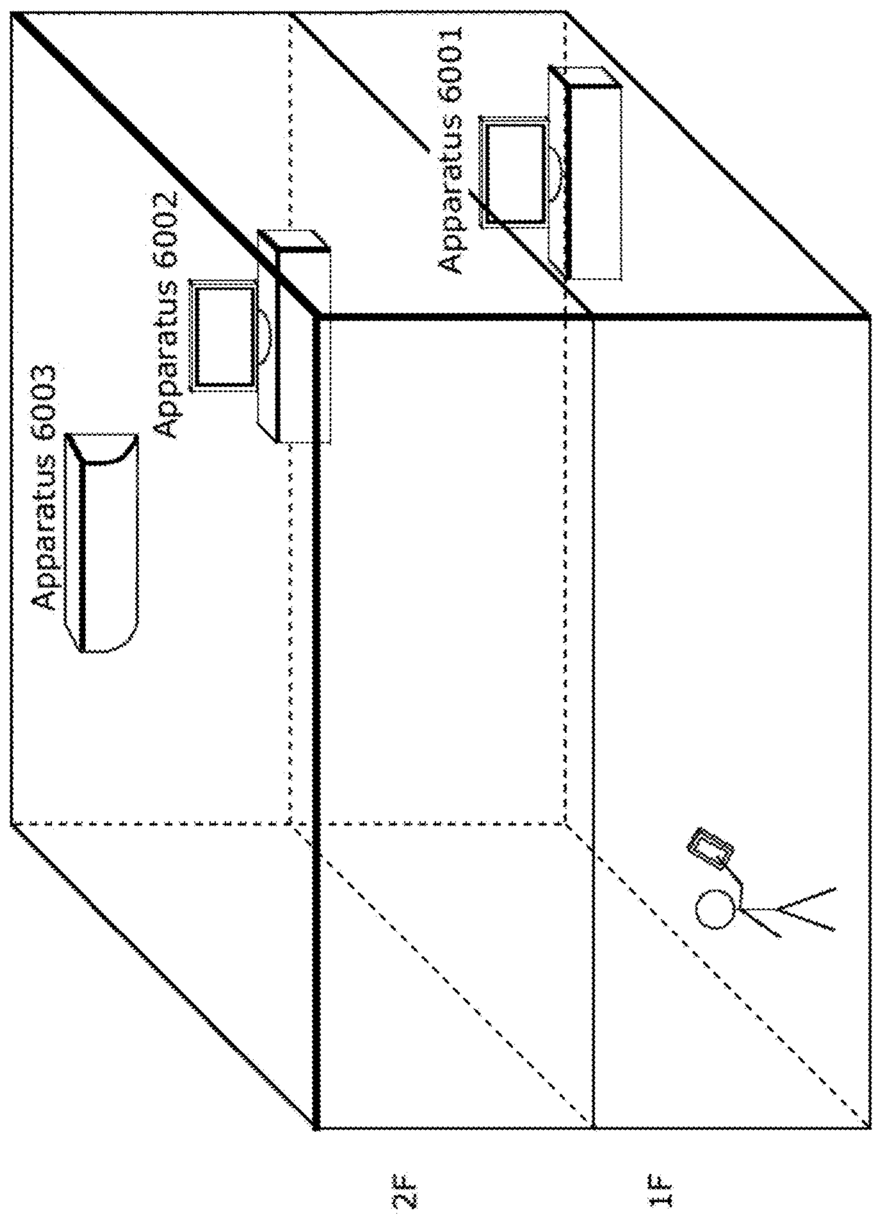

FIG. 209 is a schematic diagram of remote control operation for the second floor, according to Embodiment 19 of the present invention.

Figure 210:
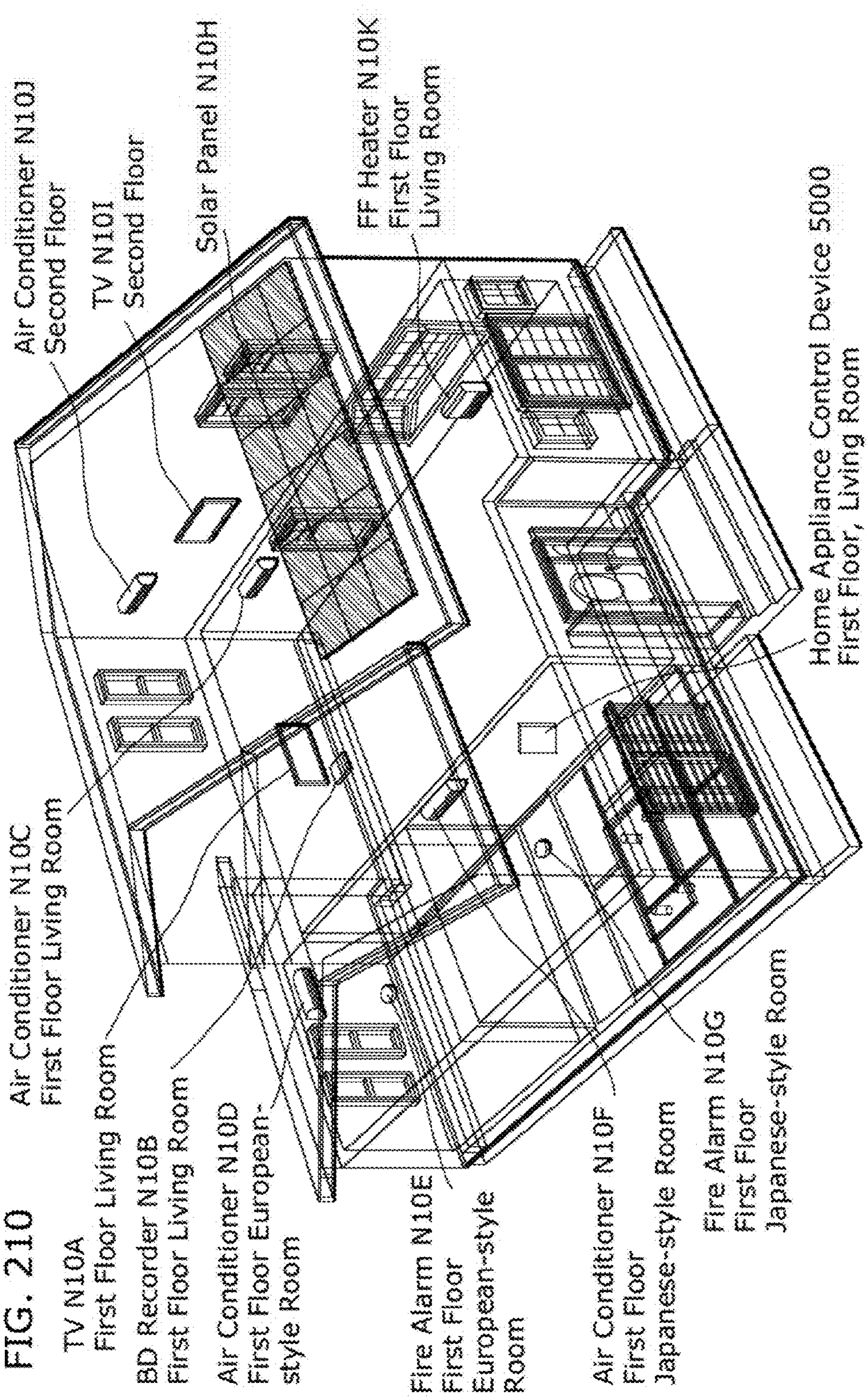

FIG. 210 is a configuration of network environment for apparatus connection setting according to Embodiment 20 of the present invention.

Figure 211:
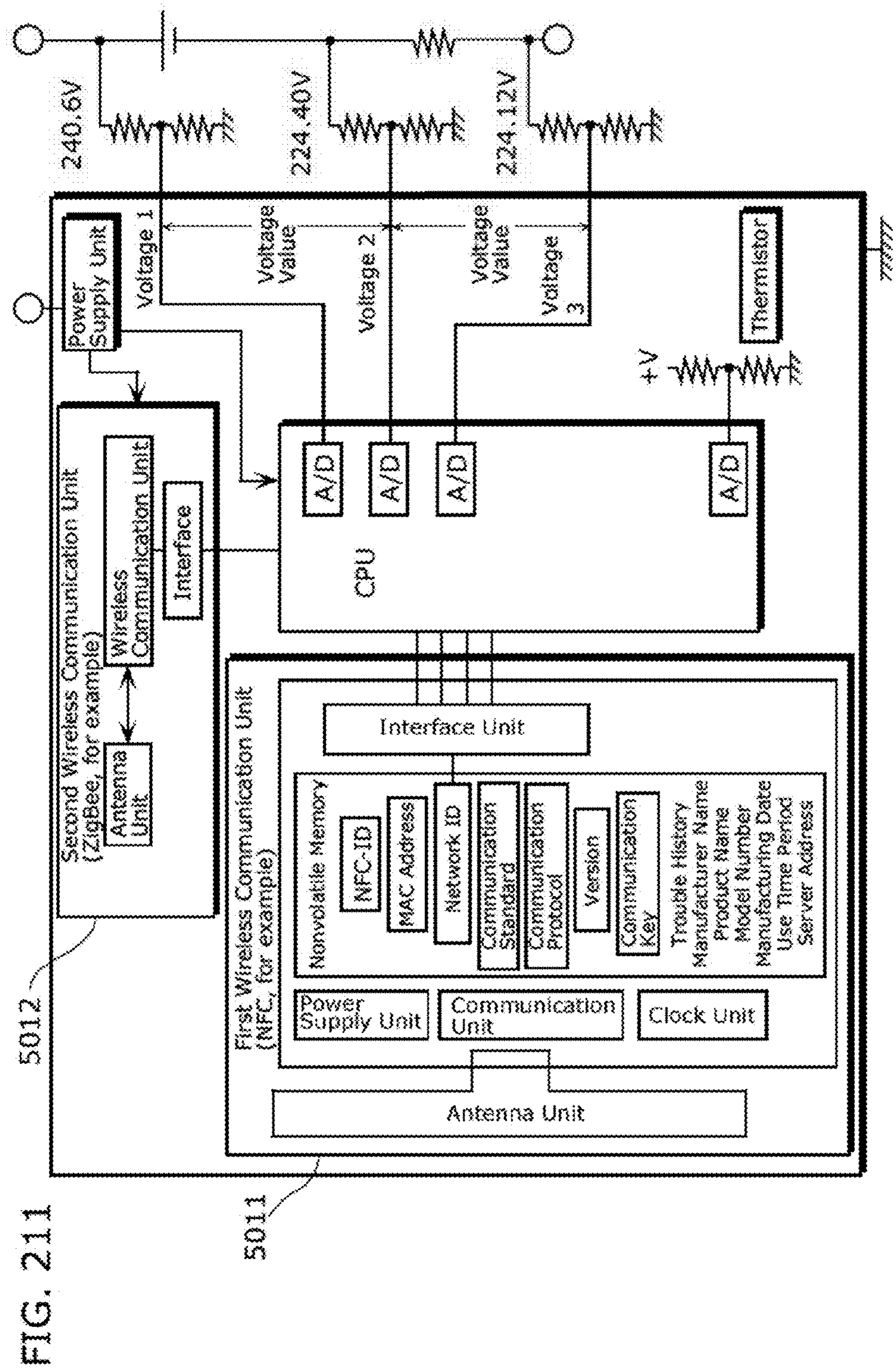

FIG. 211 is a diagram showing a structure of a network module of an apparatus according to Embodiment 20 of the present invention.

Figure 212:
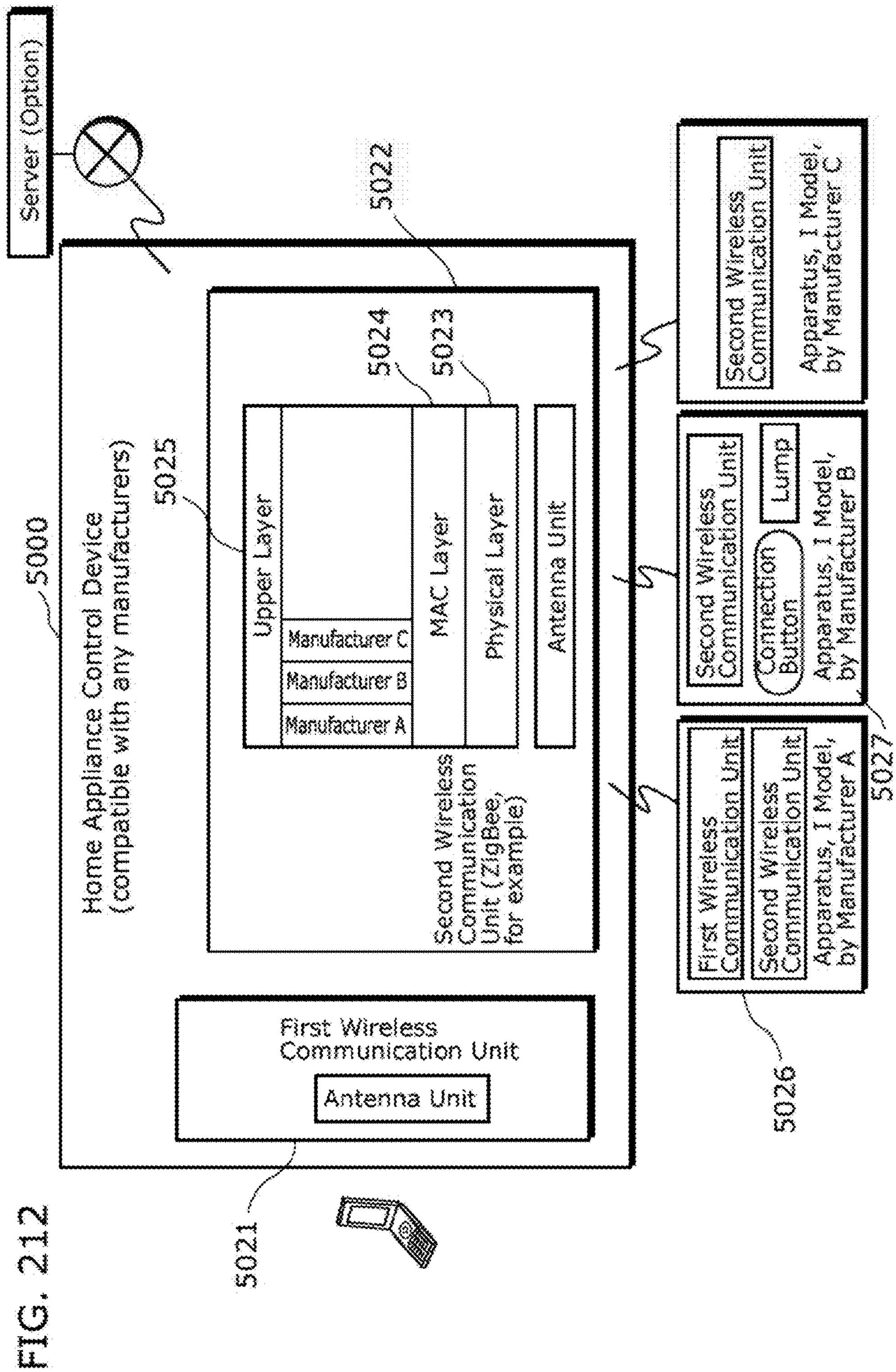

FIG. 212 is a functional block diagram of a structure of a home appliance control device according to Embodiment 20 of the present invention.

Figure 213:
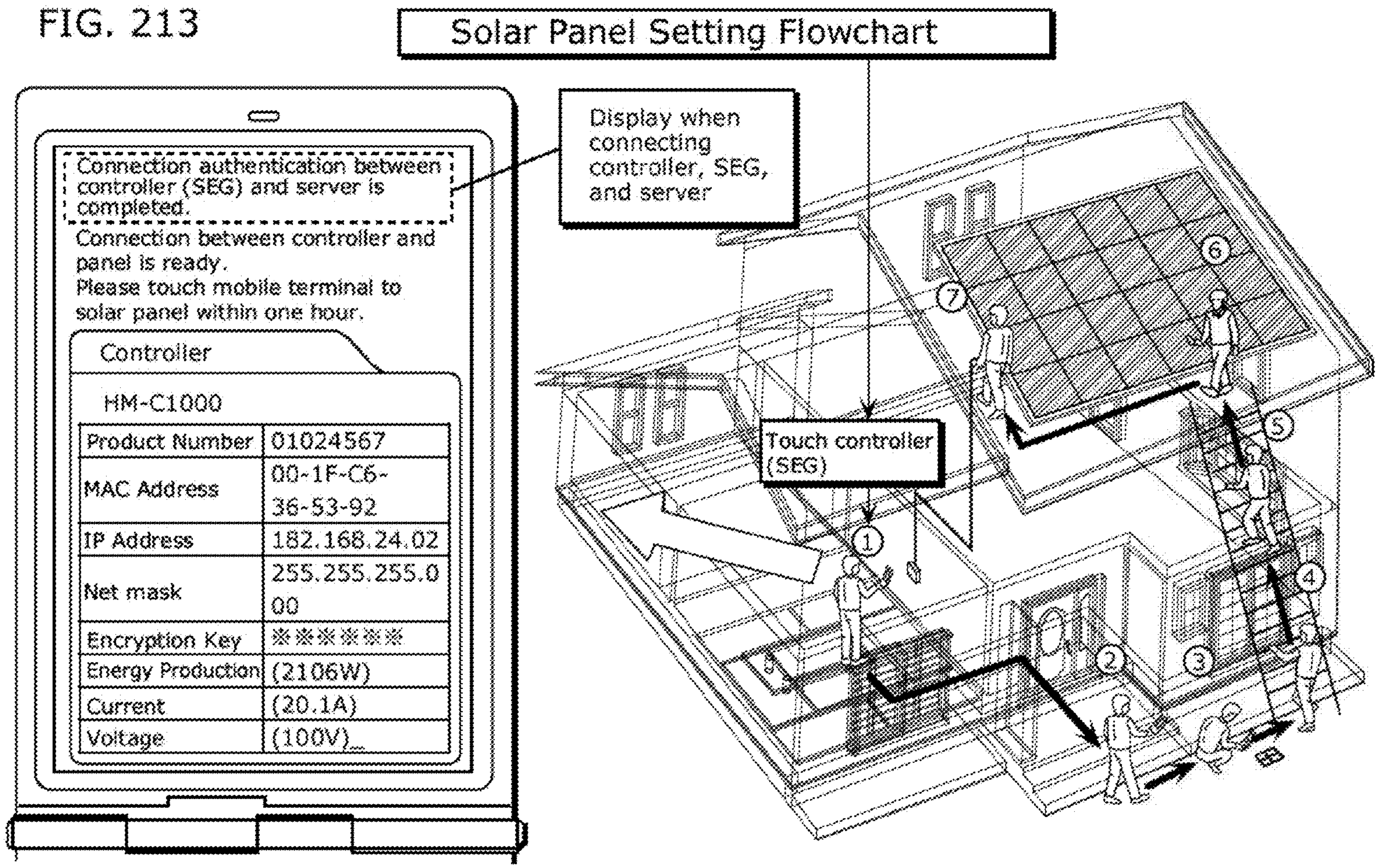

FIG. 213 is a diagram for explaining an operation when setting a solar panel according to Embodiment 20 of the present invention.

Figure 214:
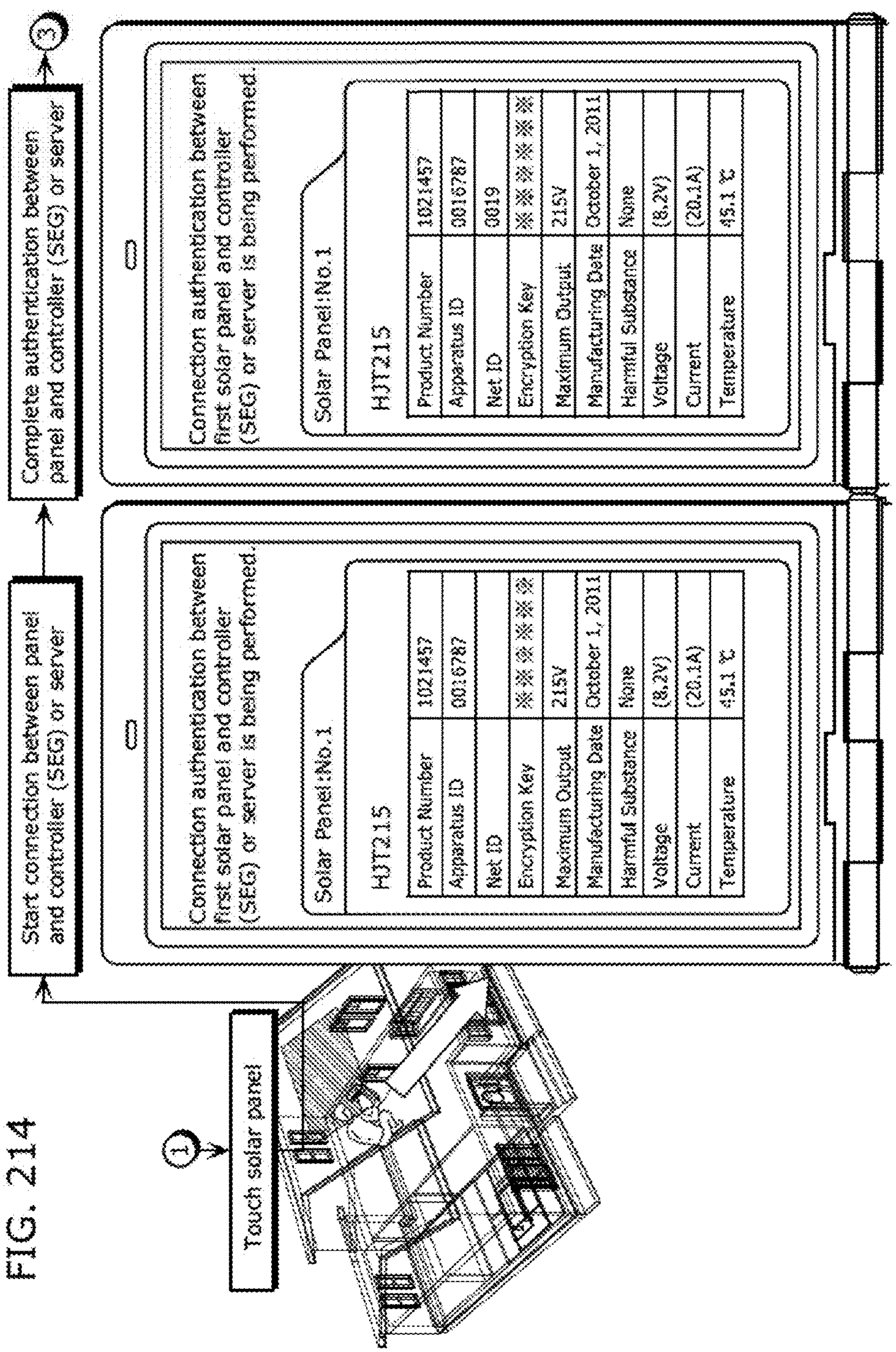

FIG. 214 is a diagram of switching of a mobile terminal screen in setting the solar panel according to Embodiment 20 of the present invention.

Figure 215:
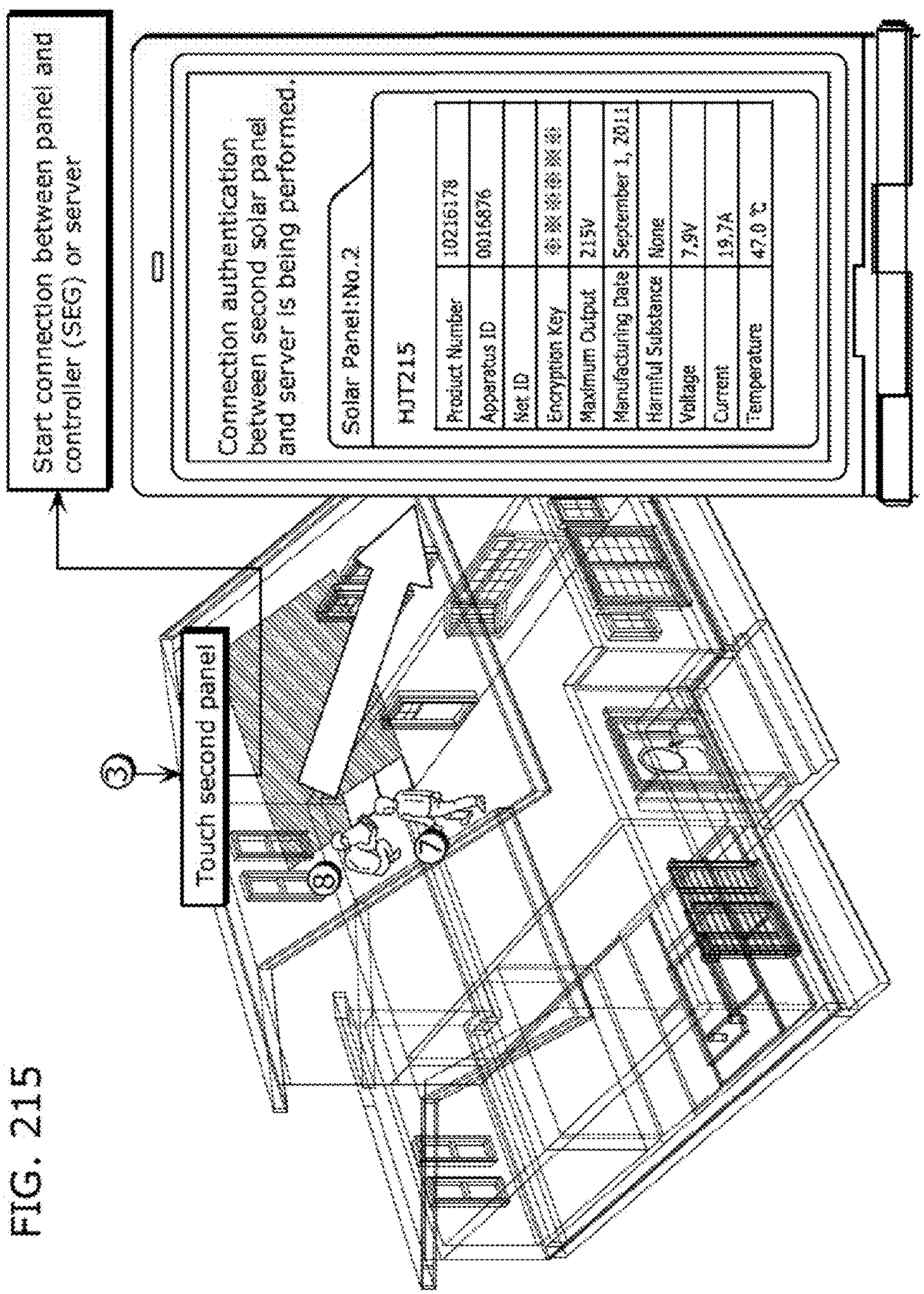

FIG. 215 is a diagram of switching of a mobile terminal screen in subsequent authentication of the solar panel according to Embodiment 20 of the present invention.

Figure 216:
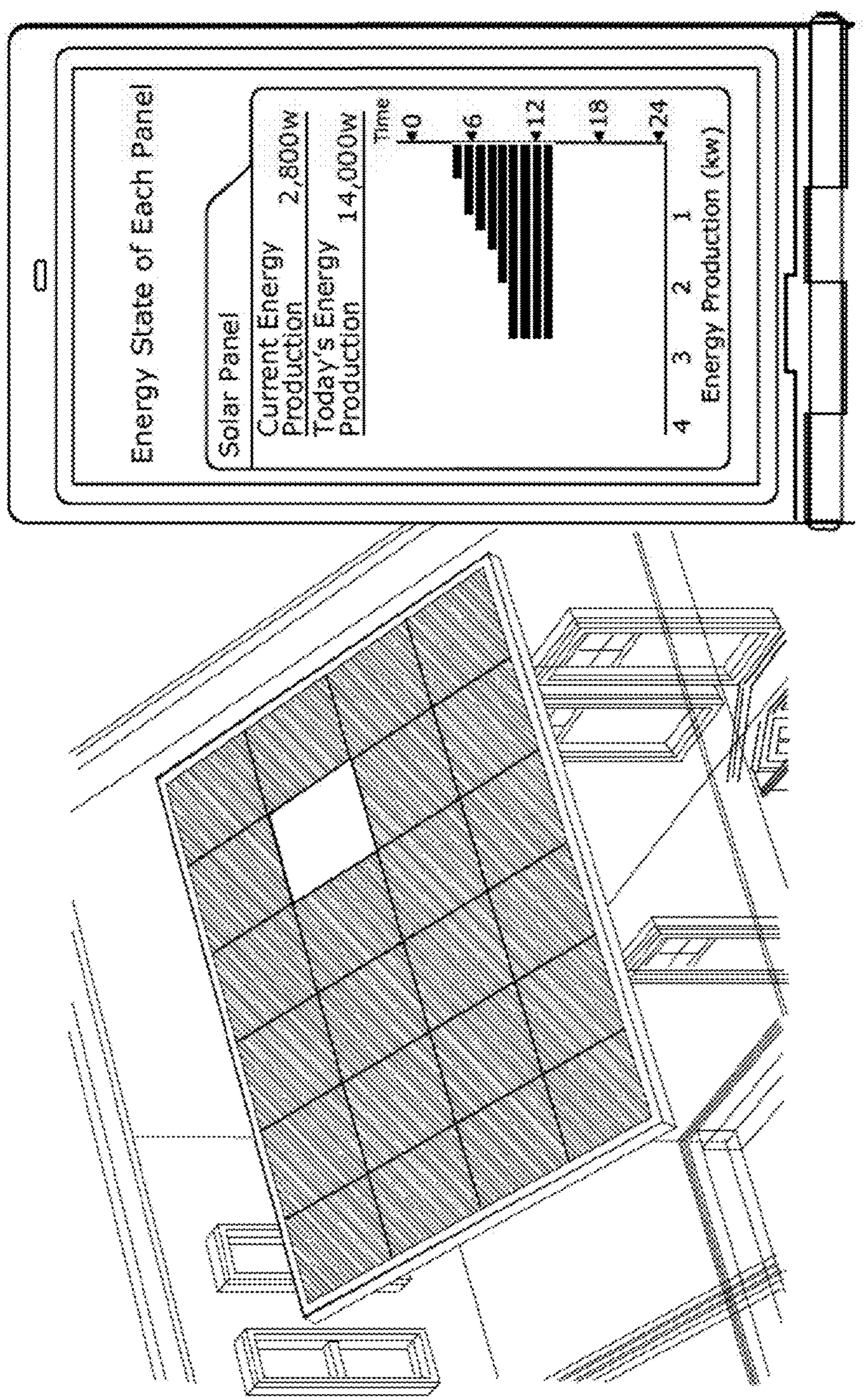

FIG. 216 is a diagram of a mobile terminal screen in checking energy production of a target solar panel according to Embodiment 20 of the present invention.

Figure 217:
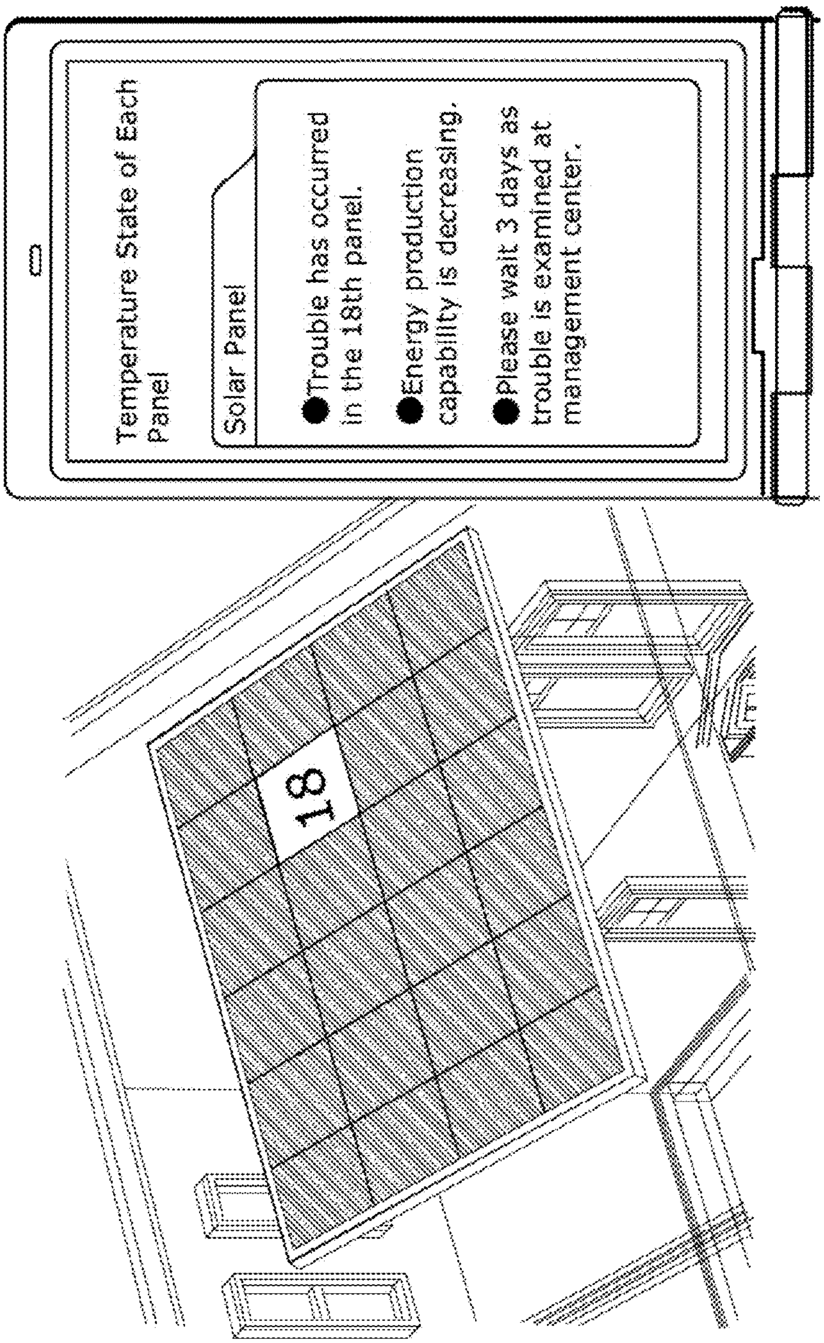

FIG. 217 is a diagram of a mobile terminal screen in checking a trouble of a solar panel according to Embodiment 20 of the present invention.

Figure 218:
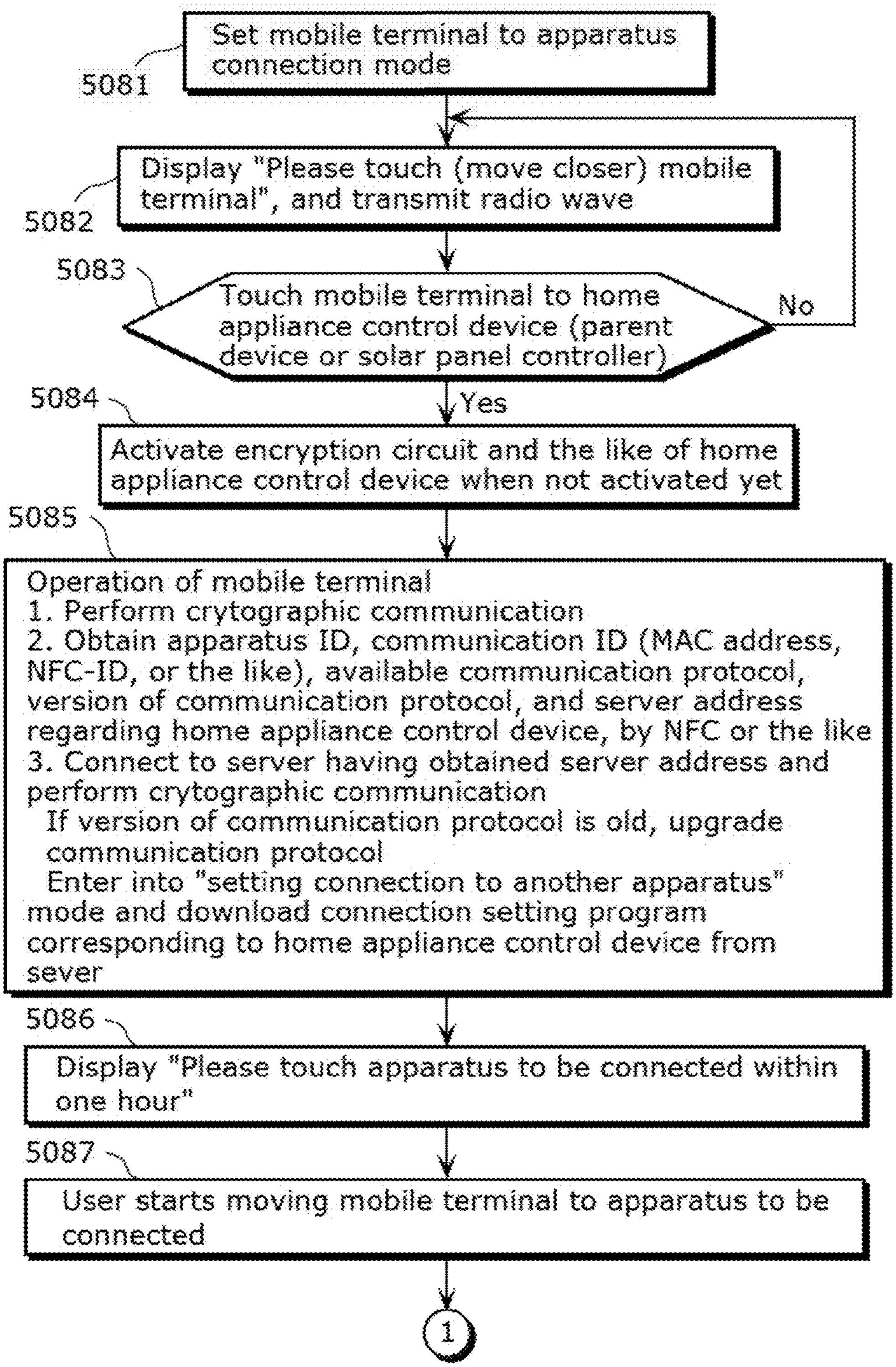

FIG. 218 is a flowchart when setting the solar panel according to Embodiment 20 of the present invention.

Figure 219:
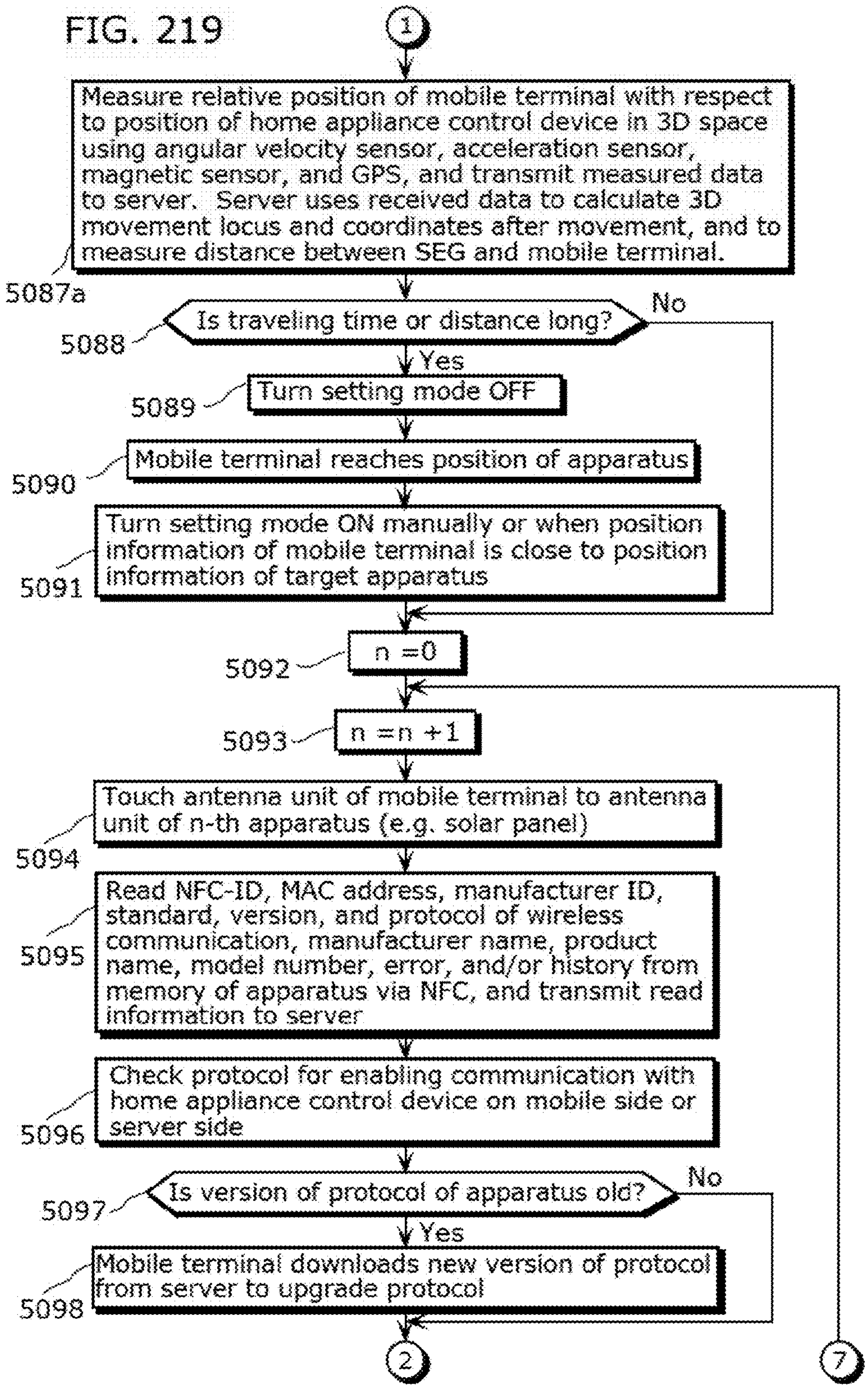

FIG. 219 is a flowchart when setting the solar panel according to Embodiment 20 of the present invention.

Figure 220:
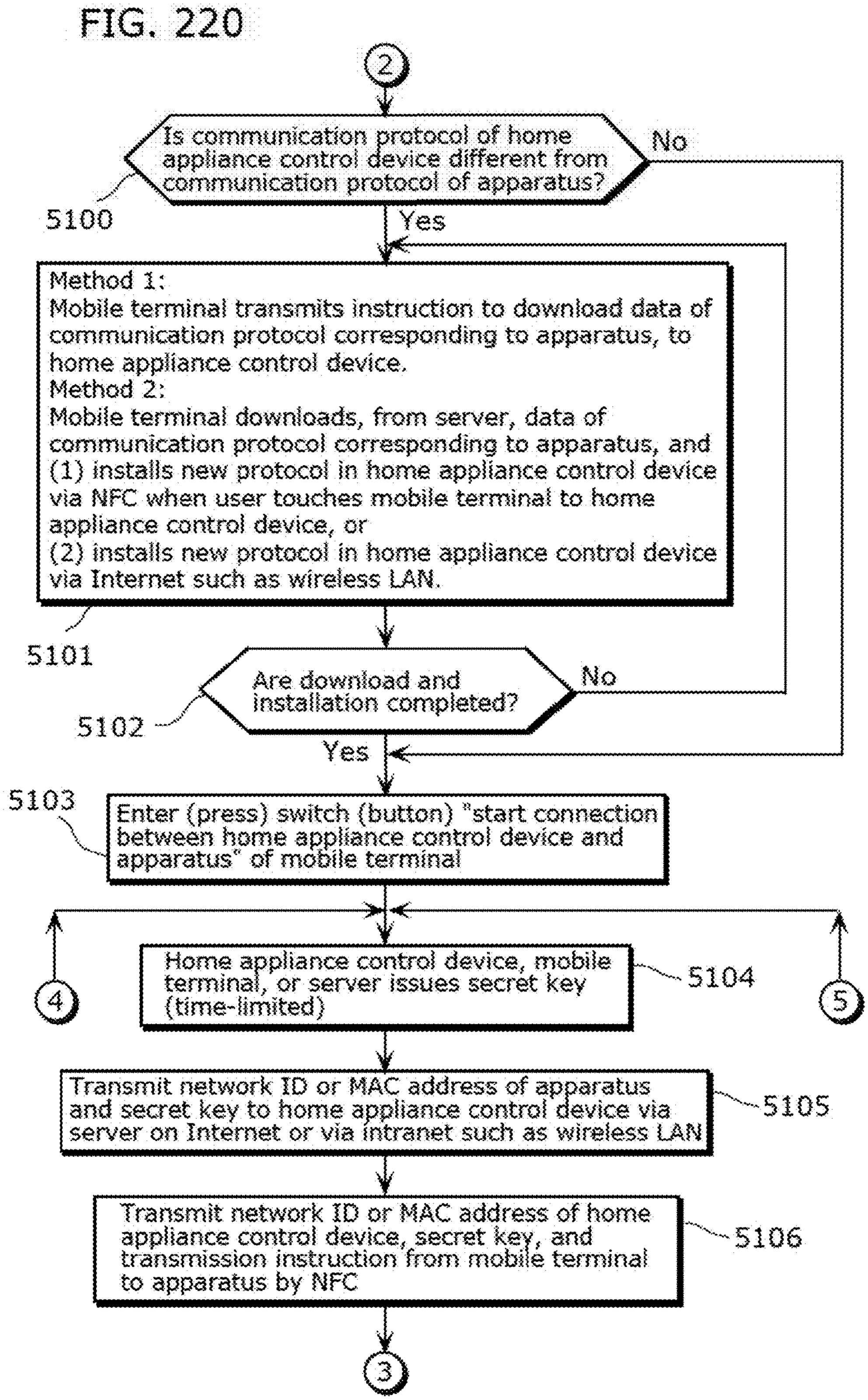

FIG. 220 is a flowchart when setting the solar panel according to Embodiment 20 of the present invention.

Figure 221:
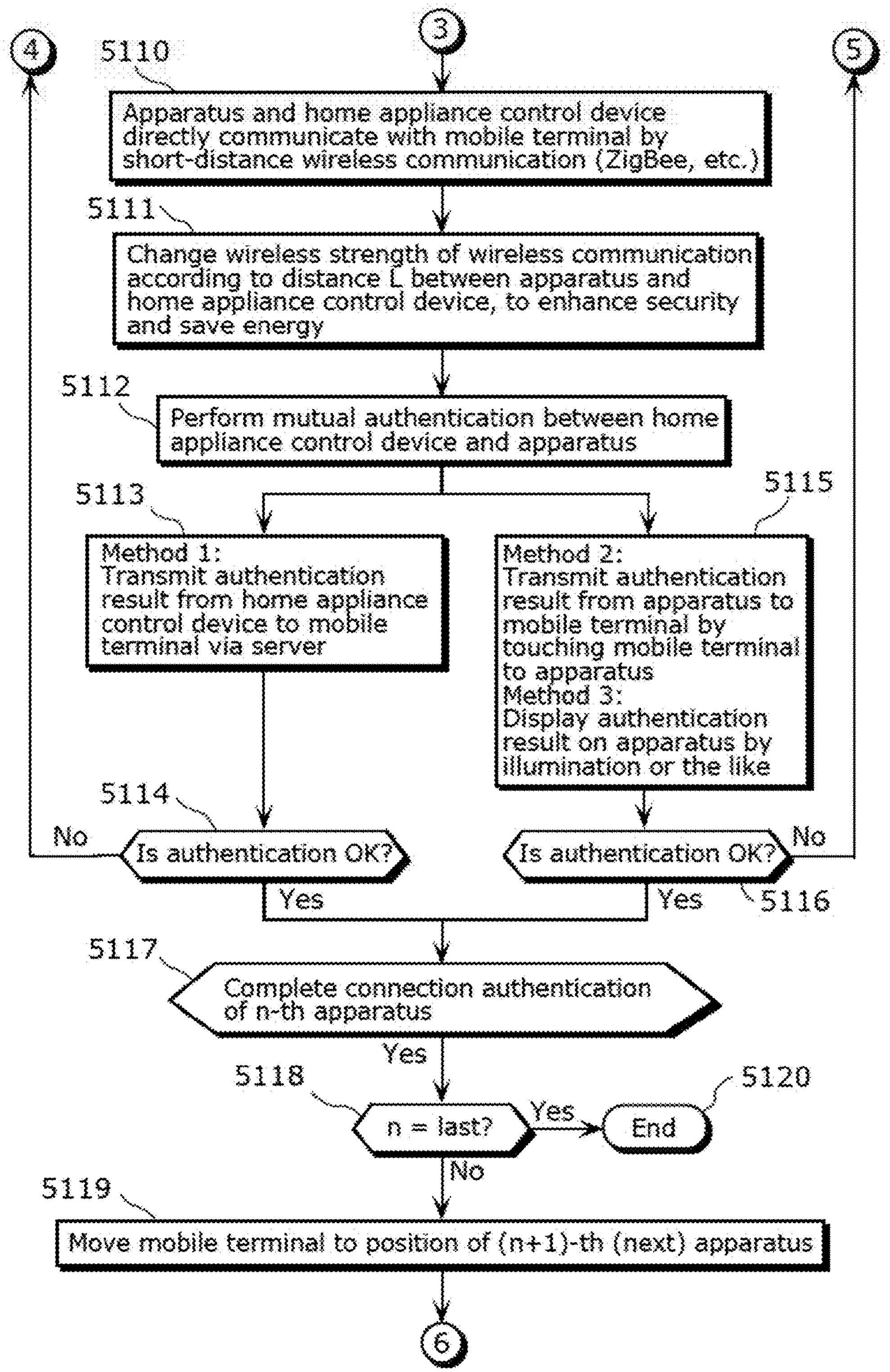

FIG. 221 is a flowchart when setting the solar panel according to Embodiment 20 of the present invention.

Figure 222:
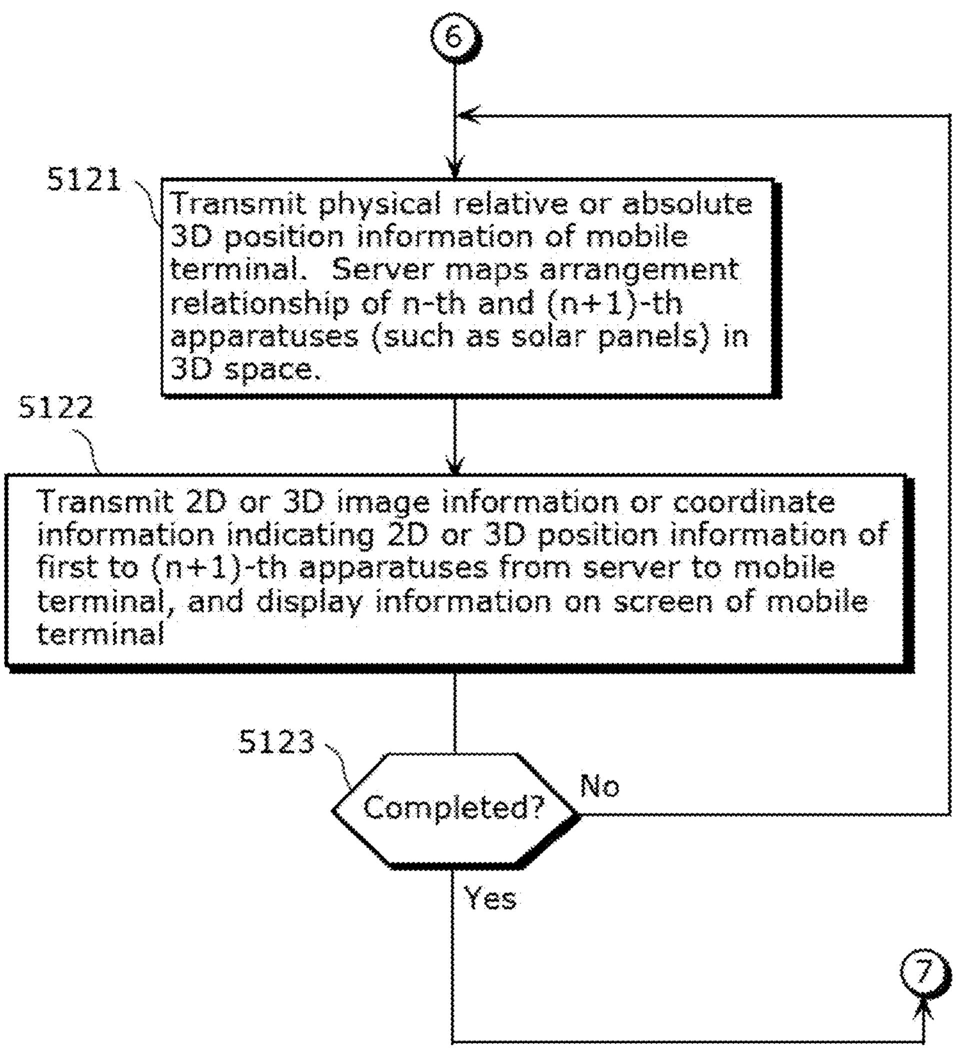

FIG. 222 is a flowchart when setting the solar panel according to Embodiment 20 of the present invention.

Figure 223:
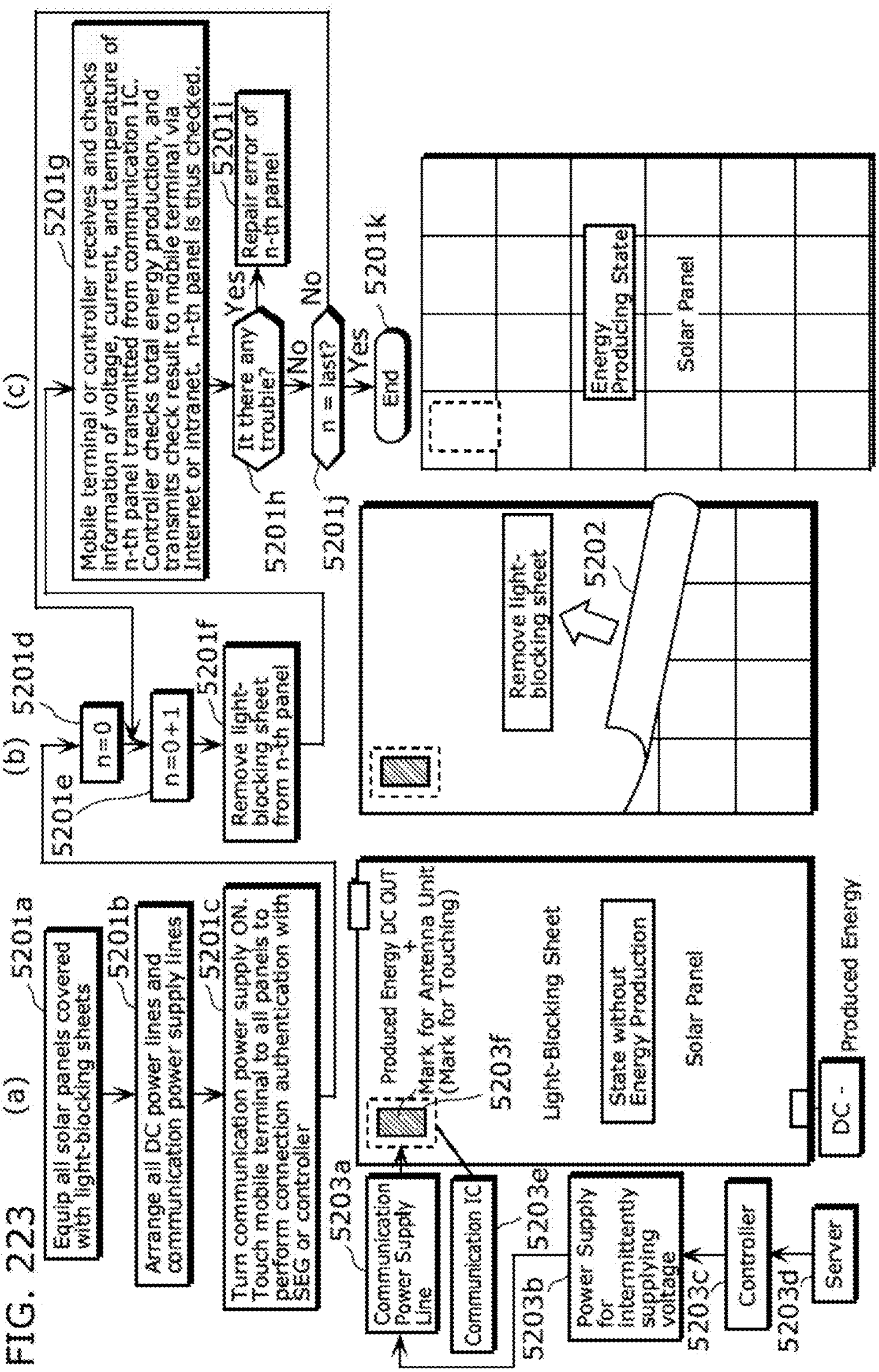

FIG. 223 is a diagram showing a procedure of equipping the solar panel according to Embodiment 20 of the present invention.

Figure 224:
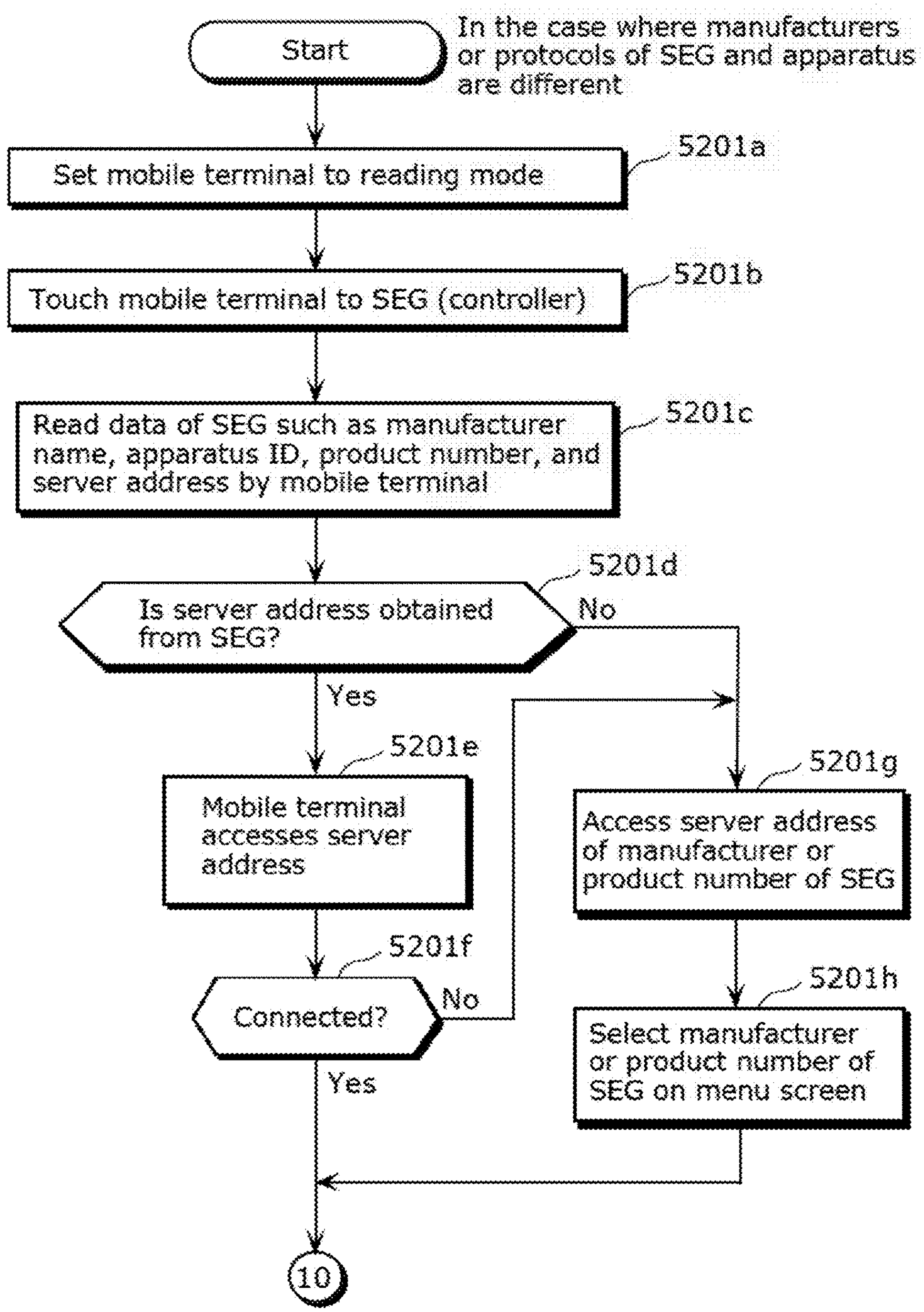

FIG. 224 is a flowchart of a procedure of connecting to a SEG according to Embodiment 20 of the present invention.

Figure 225:
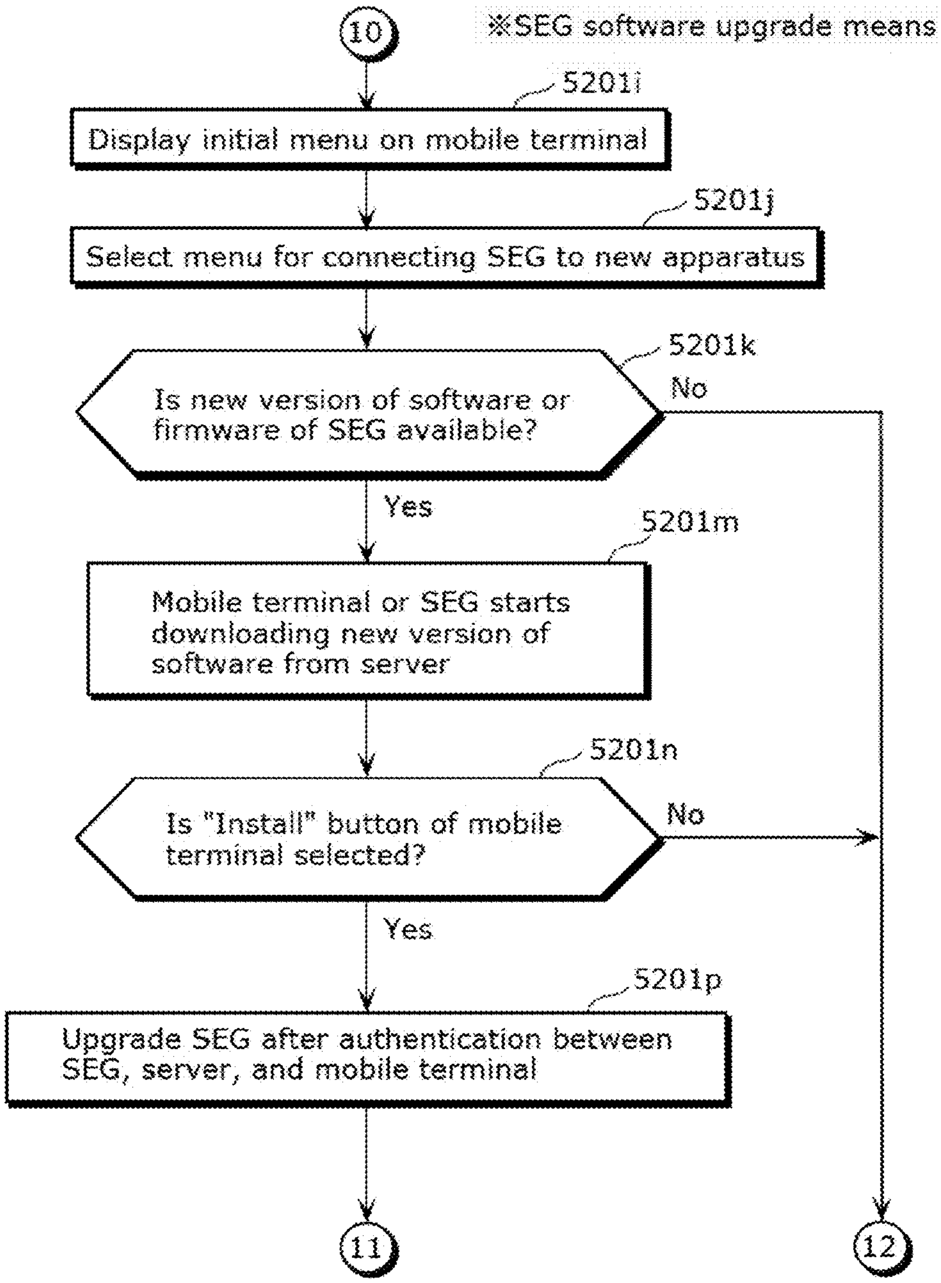

FIG. 225 is a flowchart of the procedure of connecting to the SEG according to Embodiment 20 of the present invention.

Figure 226:
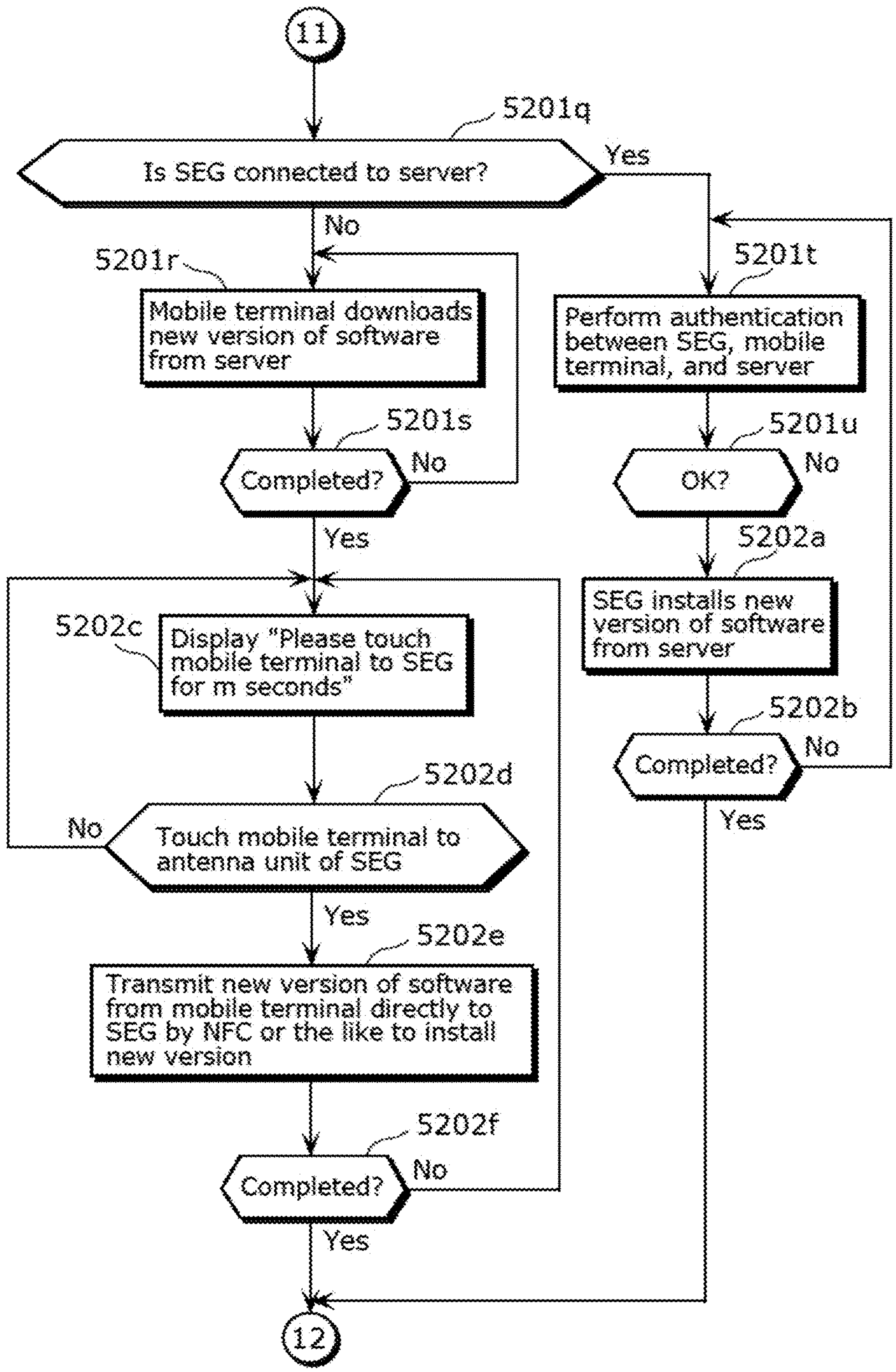

FIG. 226 is a flowchart of the procedure of connecting to the SEG according to Embodiment 20 of the present invention.

Figure 227:
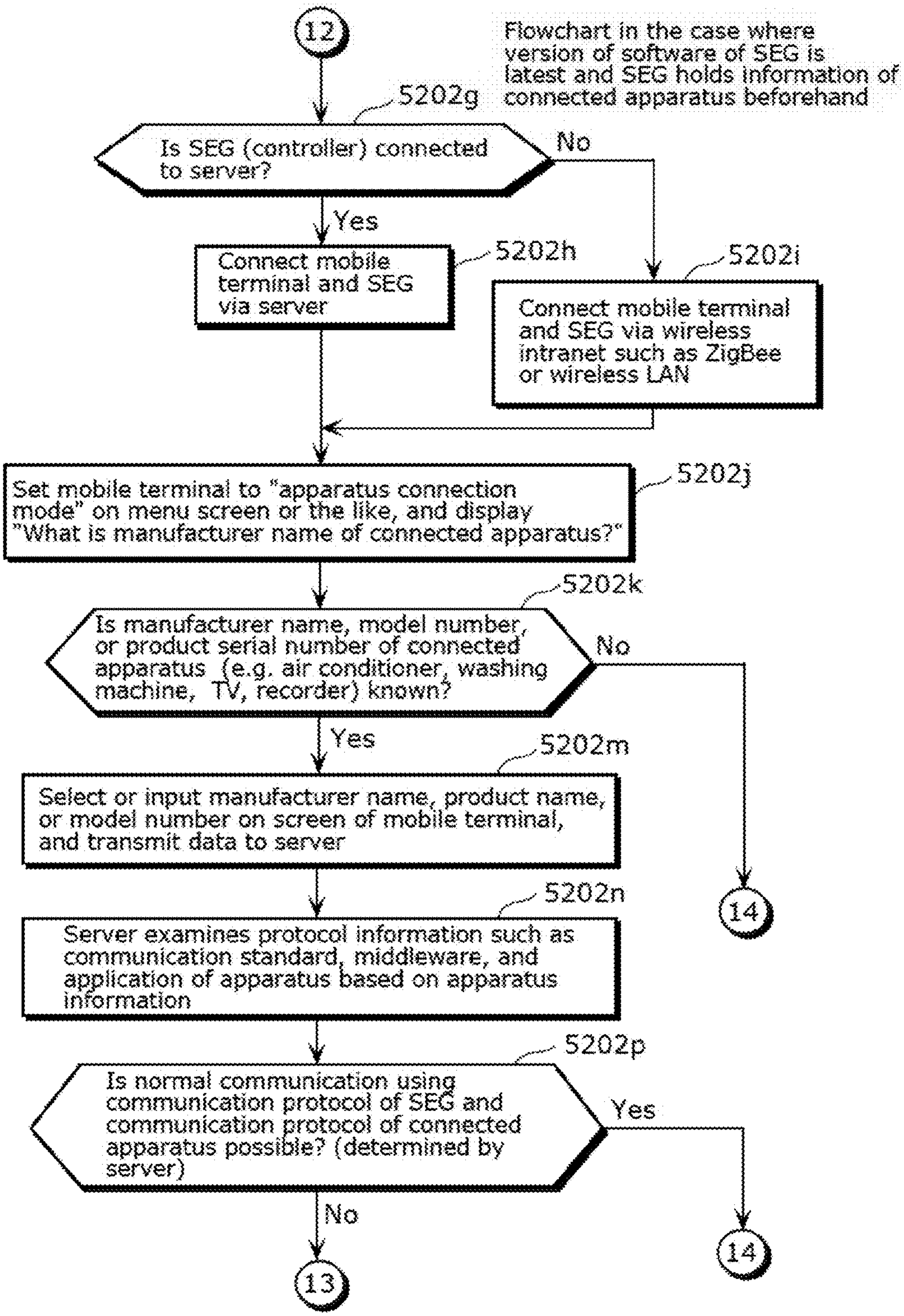

FIG. 227 is a flowchart of the procedure of connecting to the SEG according to Embodiment 20 of the present invention.

Figure 228:
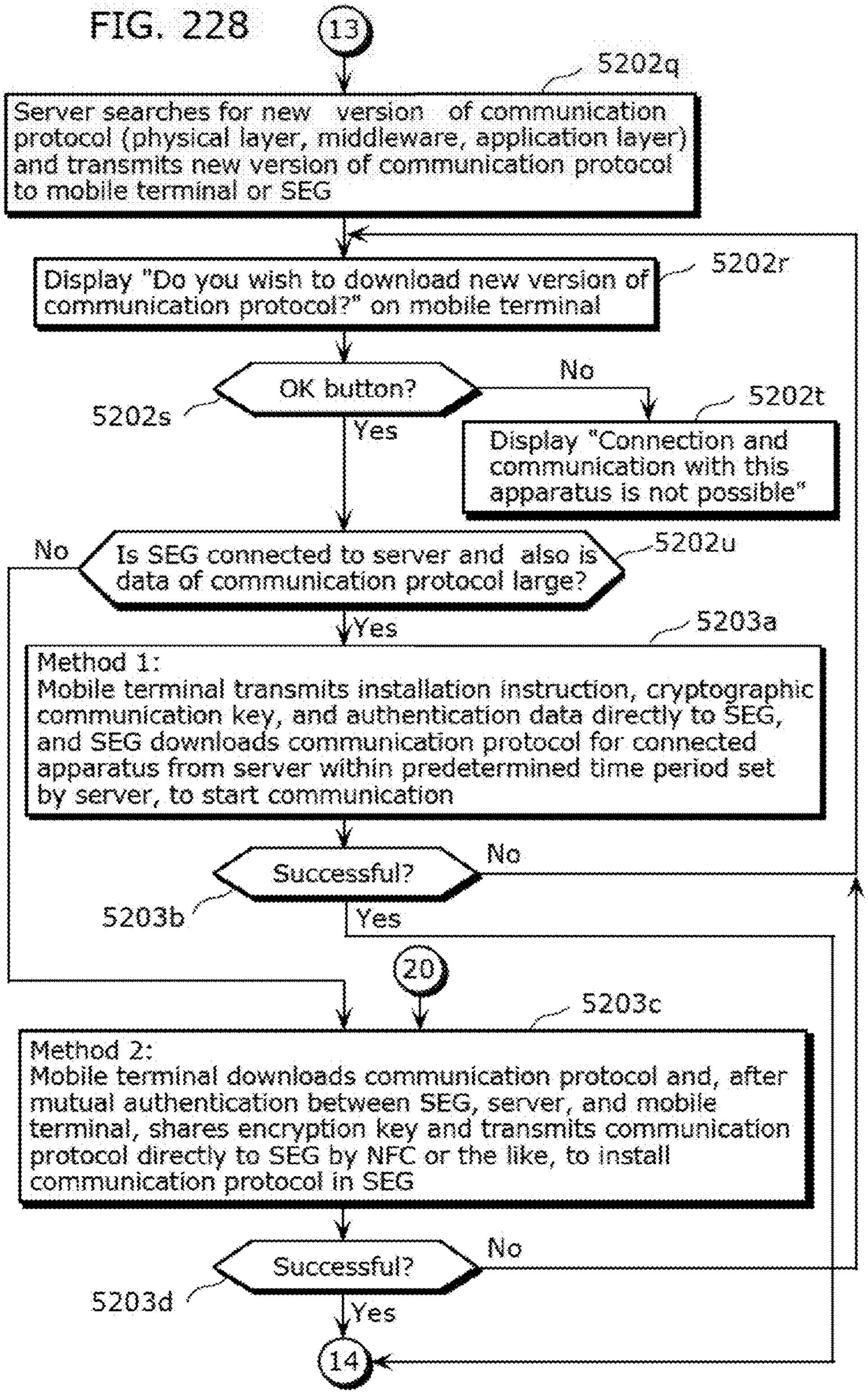

FIG. 228 is a flowchart of the procedure of connecting to the SEG according to Embodiment 20 of the present invention.

Figure 229:
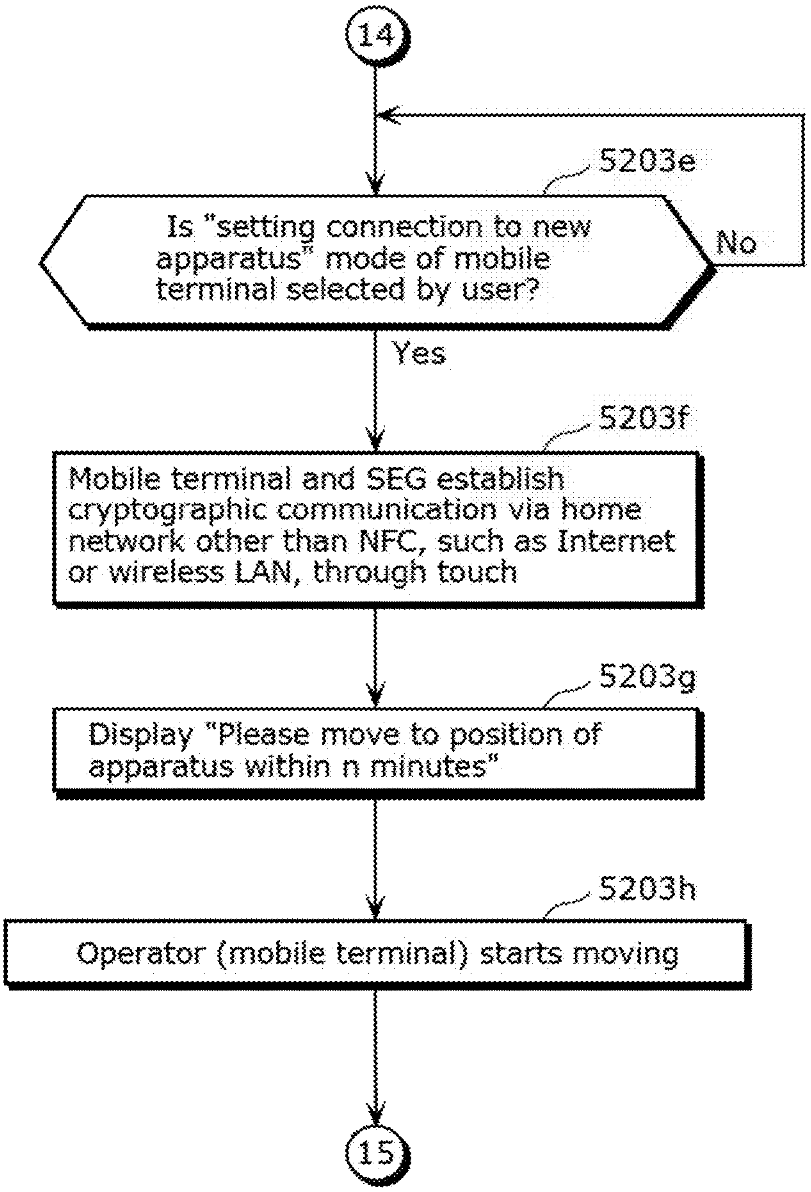

FIG. 229 is a flowchart of the procedure of connecting to the SEG according to Embodiment 20 of the present invention.

Figure 230:
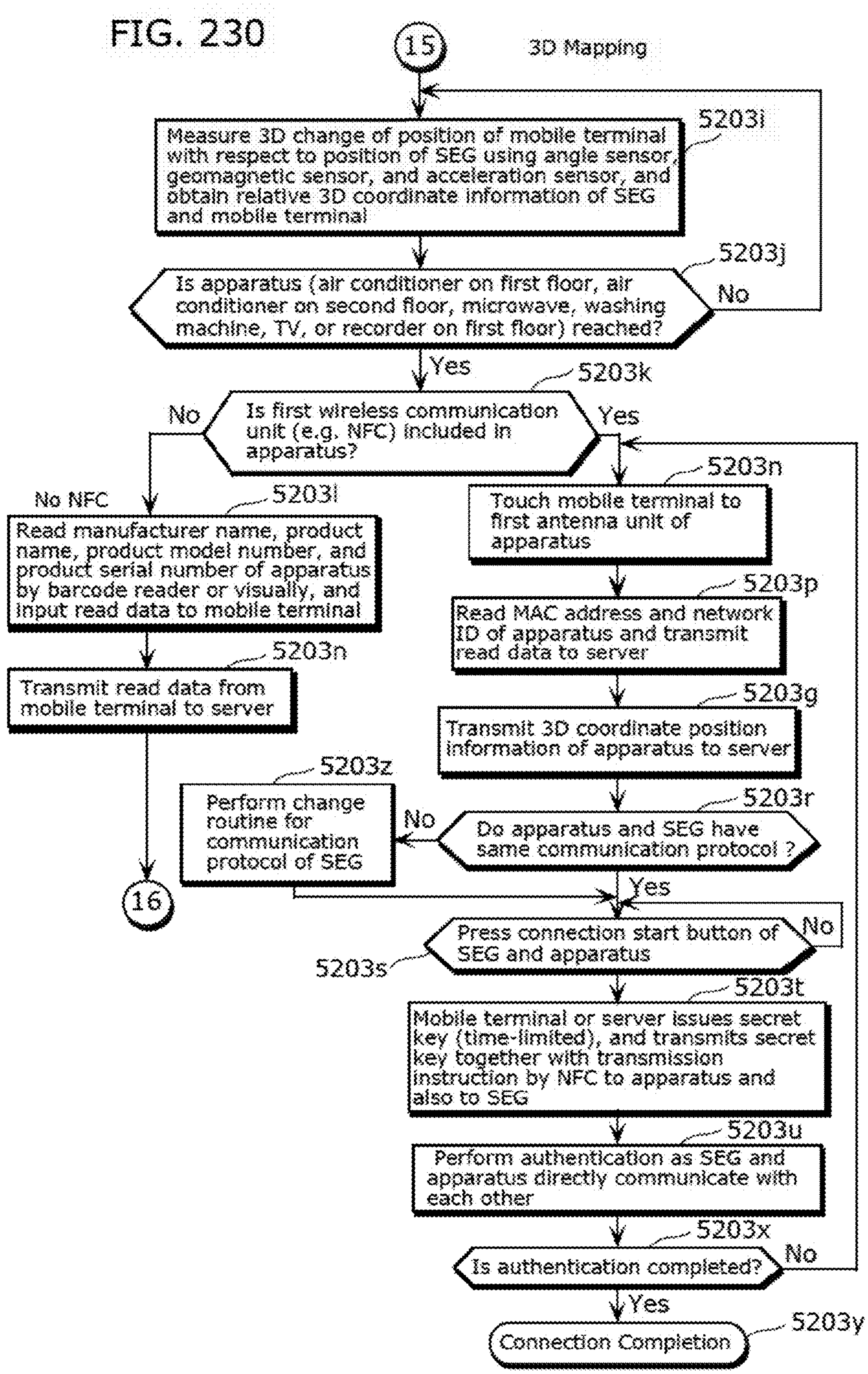

FIG. 230 is a flowchart of the procedure of connecting to the SEG according to Embodiment 20 of the present invention.

Figure 231:
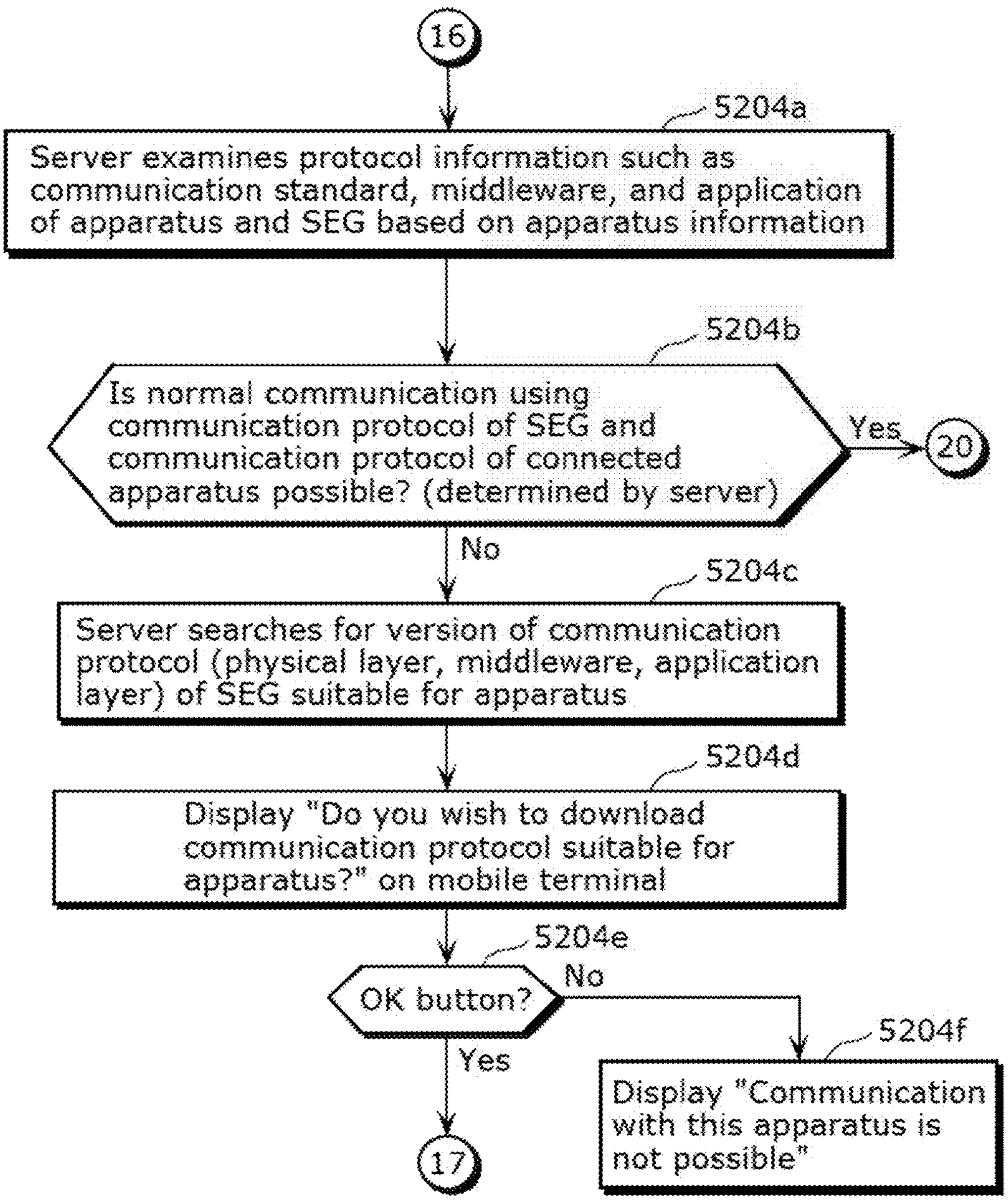

FIG. 231 is a flowchart of the procedure of connecting to the SEG according to Embodiment 20 of the present invention.

Figure 232:
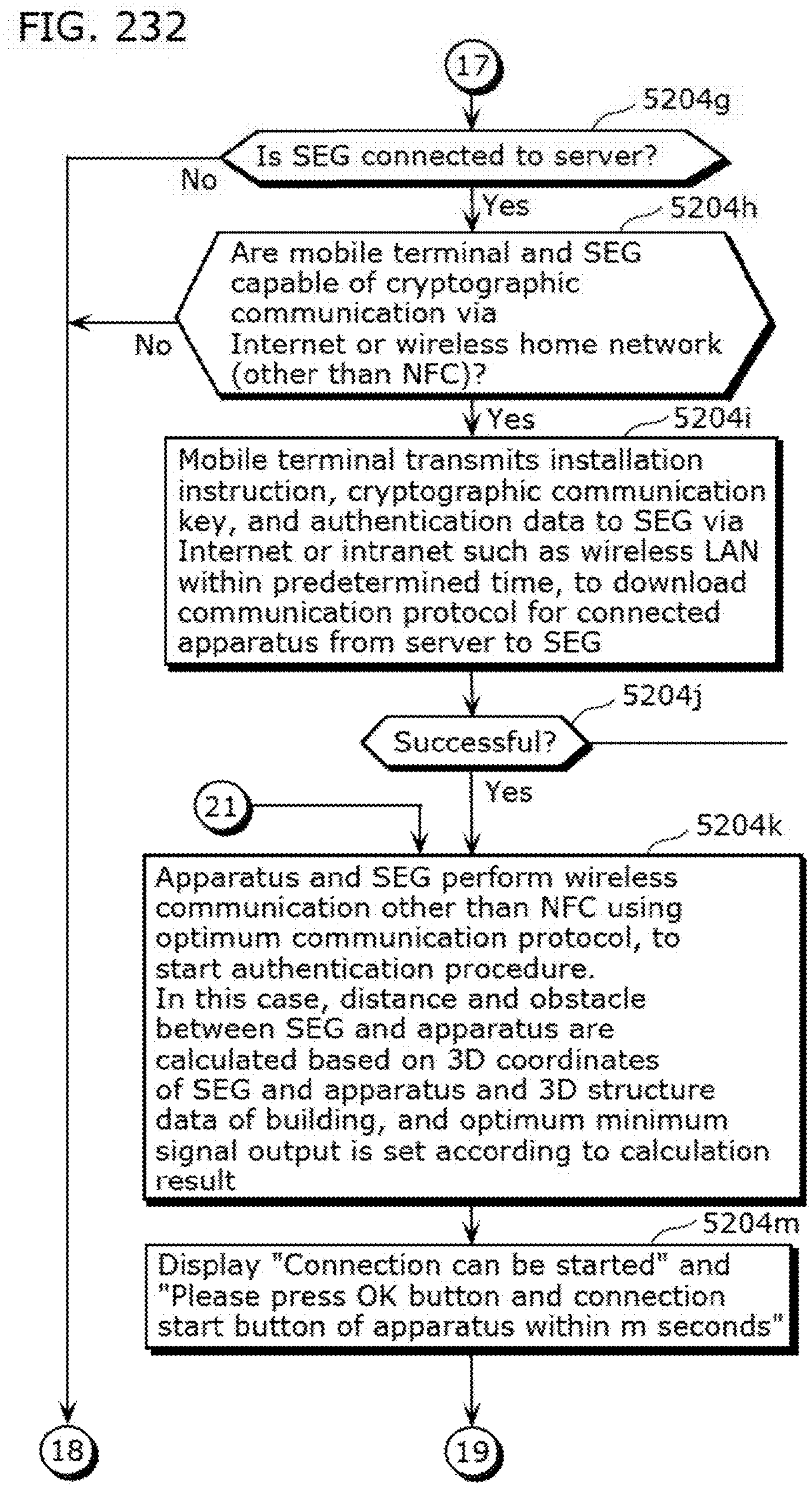

FIG. 232 is a flowchart of the procedure of connecting to the SEG according to Embodiment 20 of the present invention.

Figure 233:
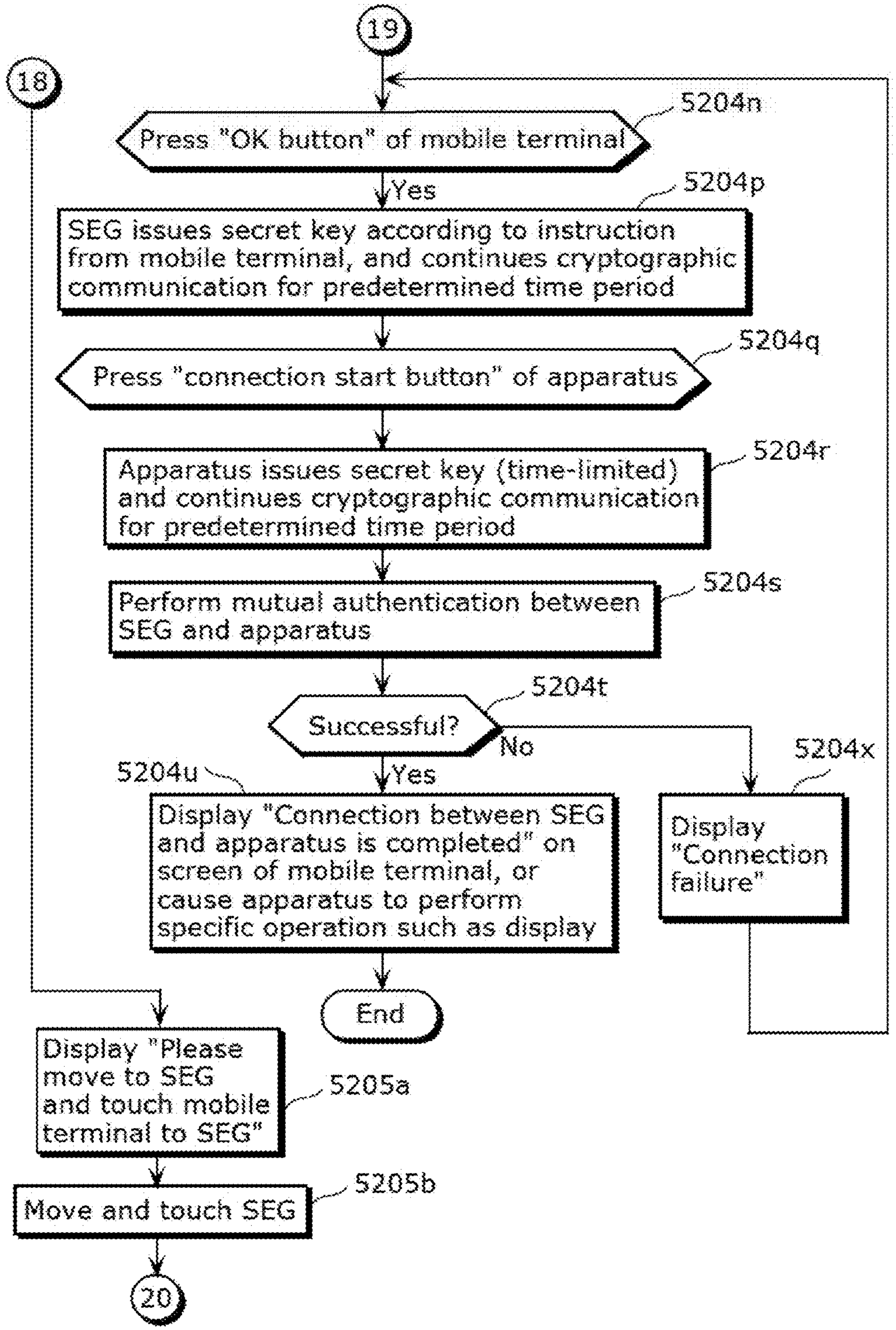

FIG. 233 is a flowchart of the procedure of connecting to the SEG according to Embodiment 20 of the present invention.

FIG. 234 is a flowchart of a connection procedure using a relay device according to Embodiment 20 of the present invention.

Figure 235:
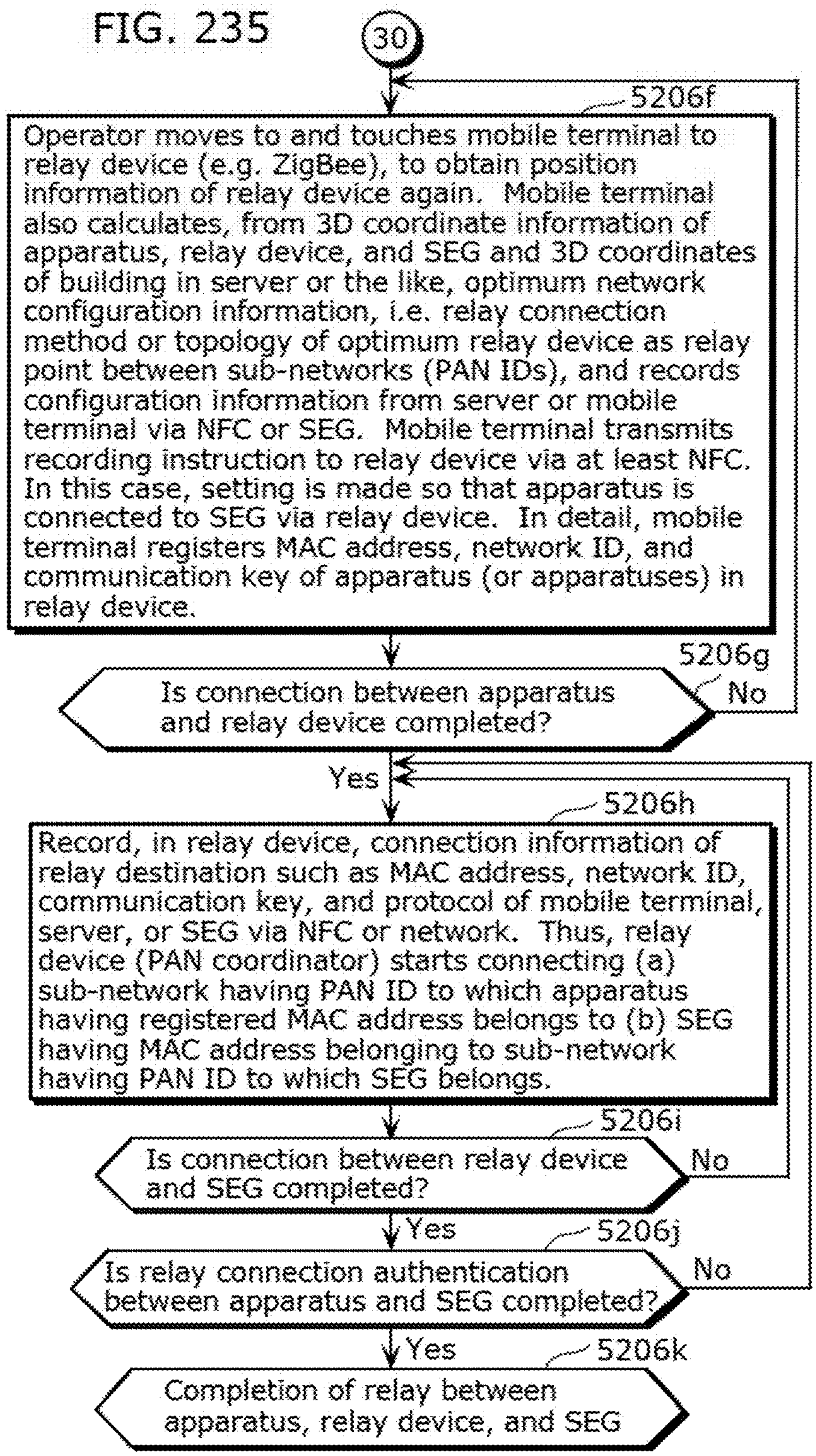

FIG. 235 is a flowchart of the connection procedure using the relay device according to Embodiment 20 of the present invention.

Figure 236:
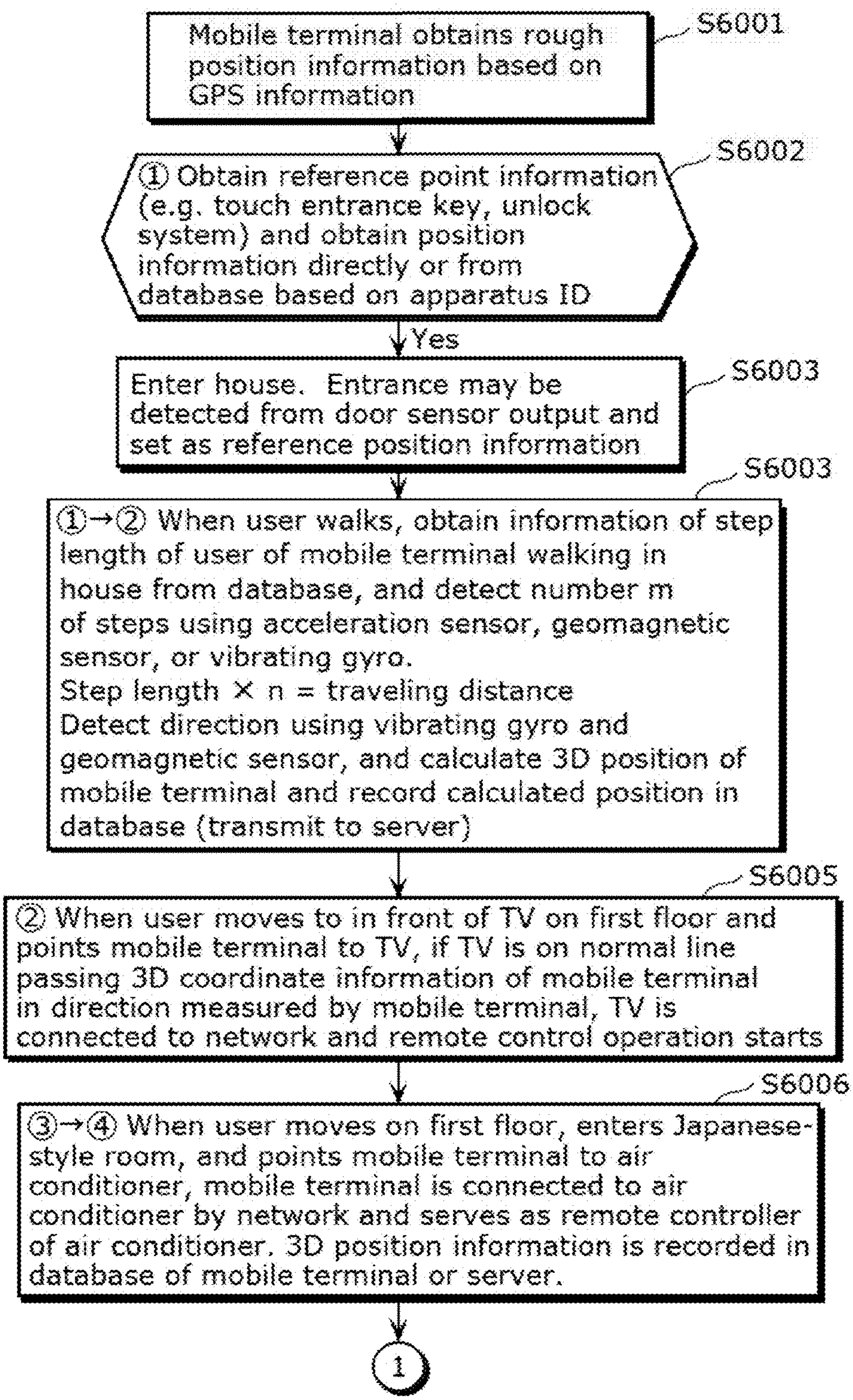

FIG. 236 is a flowchart of remote control operation according to Embodiment 21 of the present invention.

Figure 237:
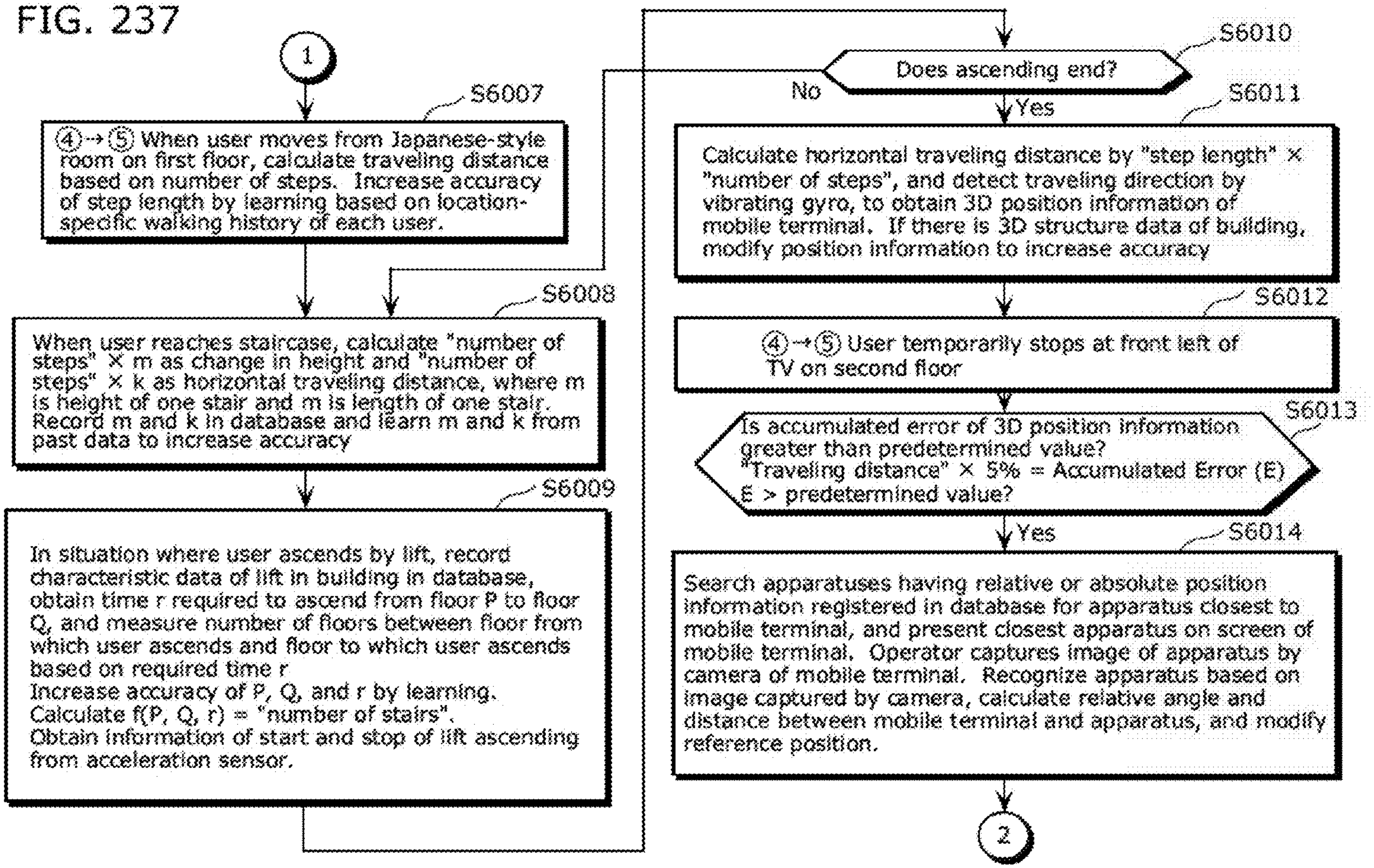

FIG. 237 is a flowchart of remote control operation according to Embodiment 21 of the present invention.

Figure 238:
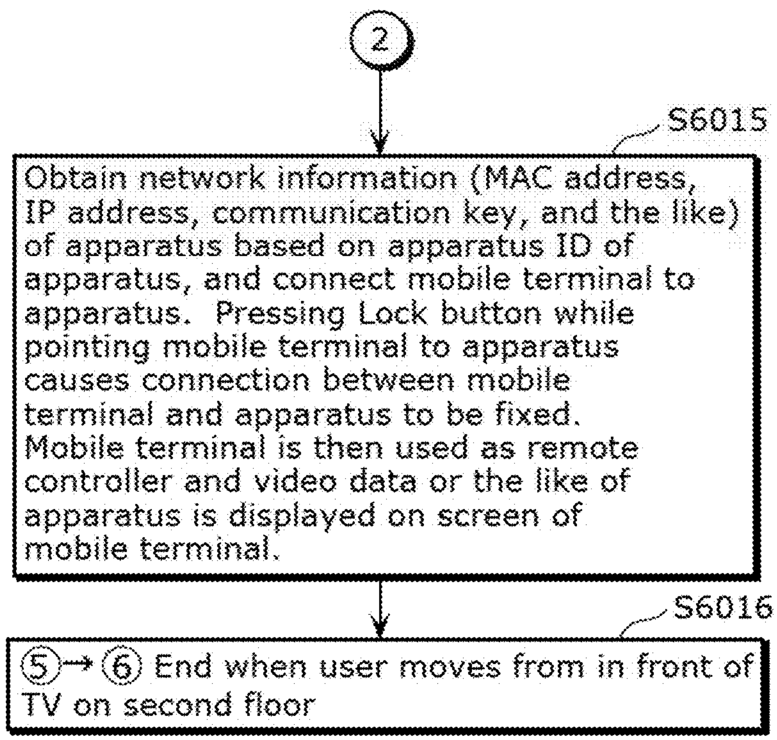

FIG. 238 is a flowchart of remote control operation according to Embodiment 21 of the present invention.

Figure 239:
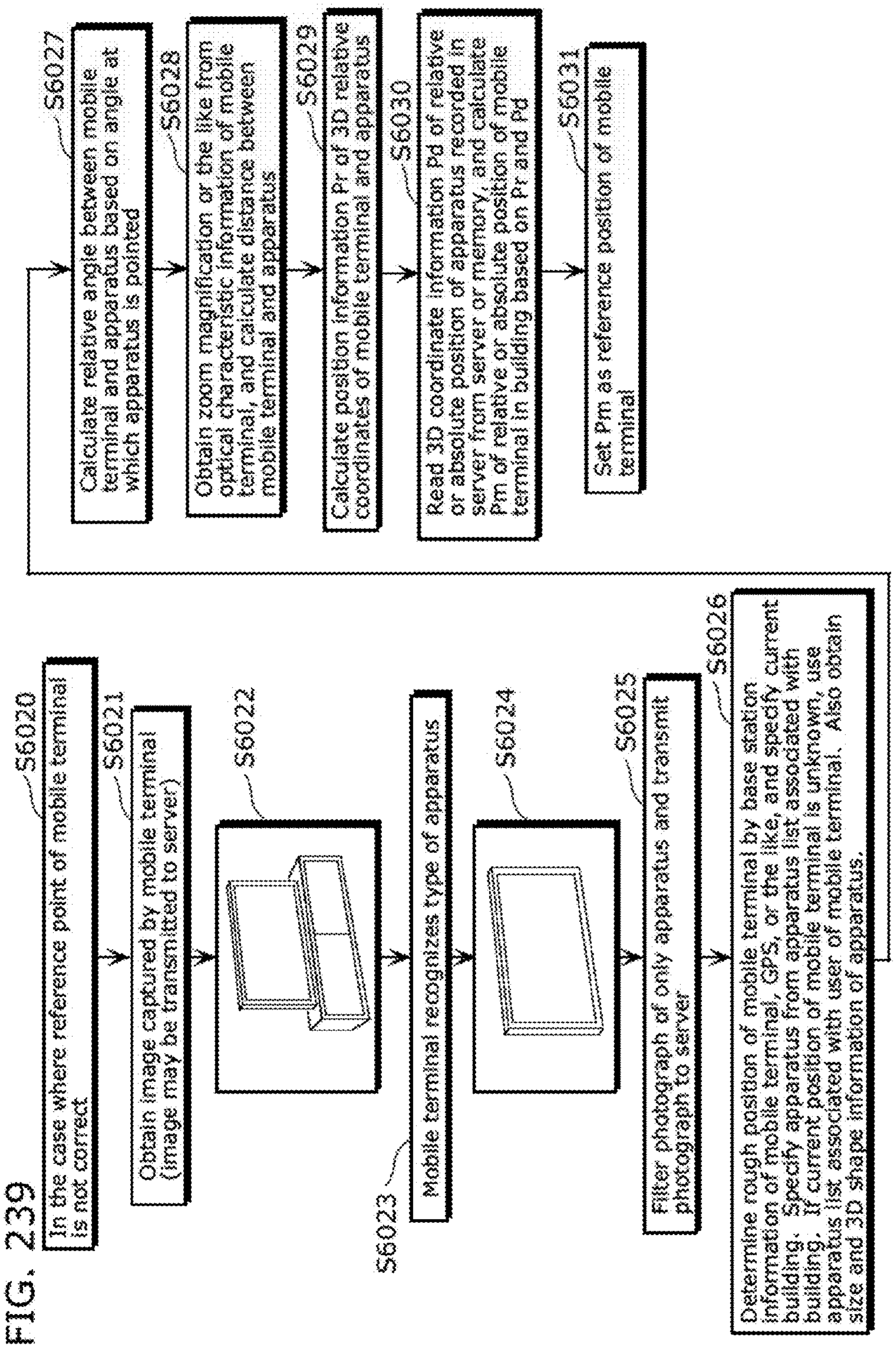

FIG. 239 is a flowchart of reference point setting in the case where a current reference point is not correct according to Embodiment 21 of the present invention.

Figure 240:
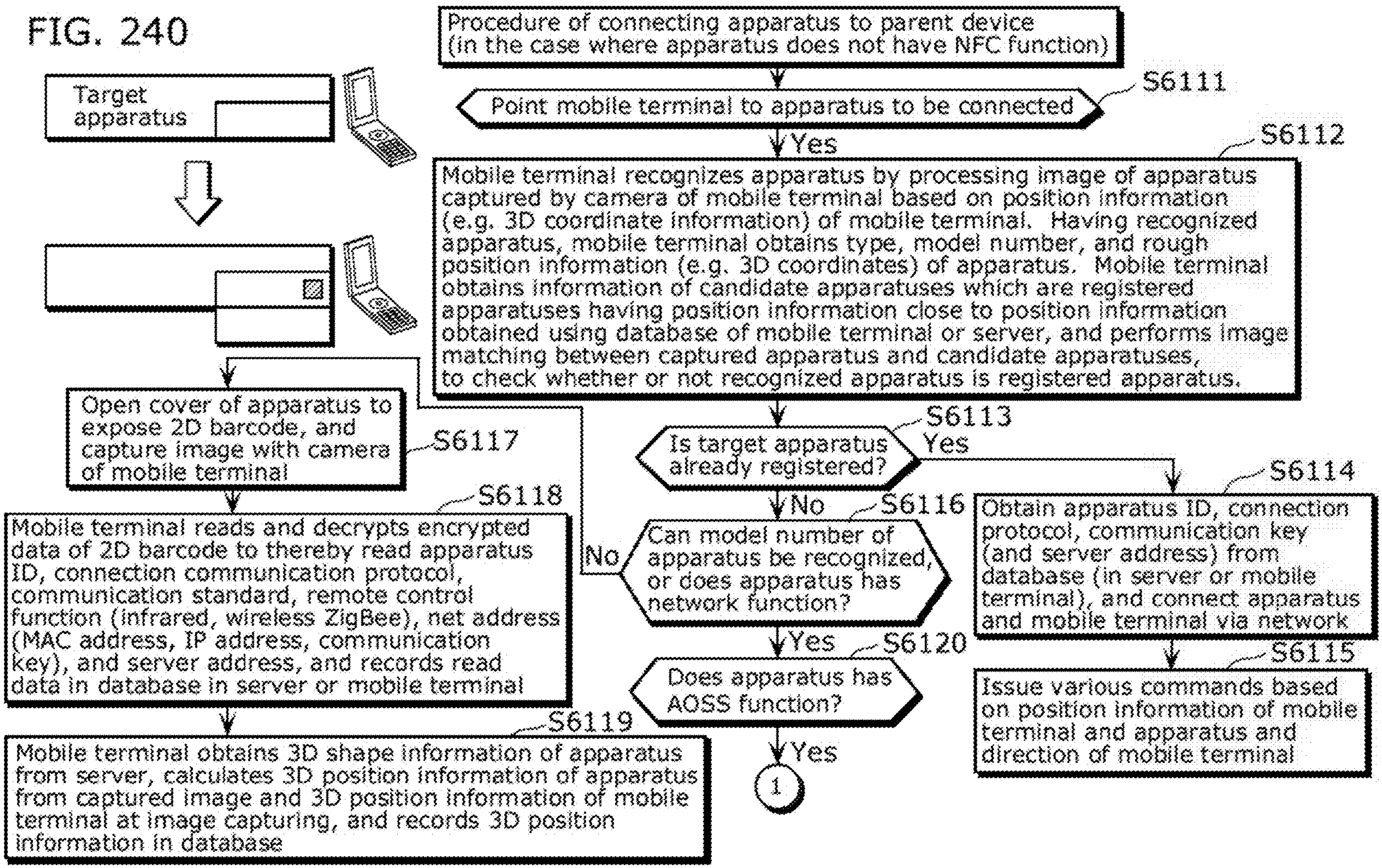

FIG. 240 is a flowchart of a procedure of connecting an apparatus and a parent device according to Embodiment 21 of the present invention.

Figure 241:
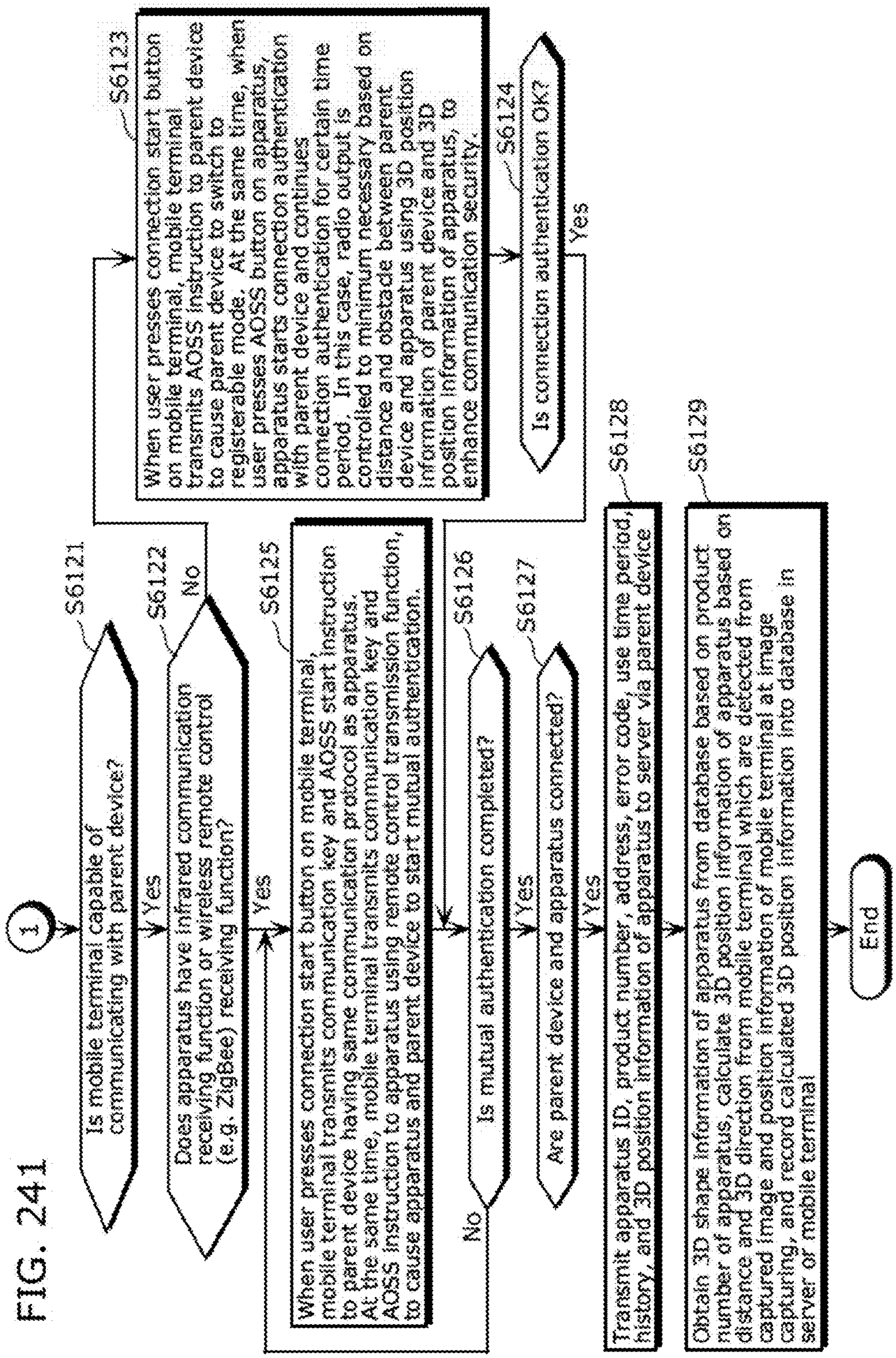

FIG. 241 is a flowchart of the procedure of connecting the apparatus and the parent device according to Embodiment 21 of the present invention.

Figure 242:
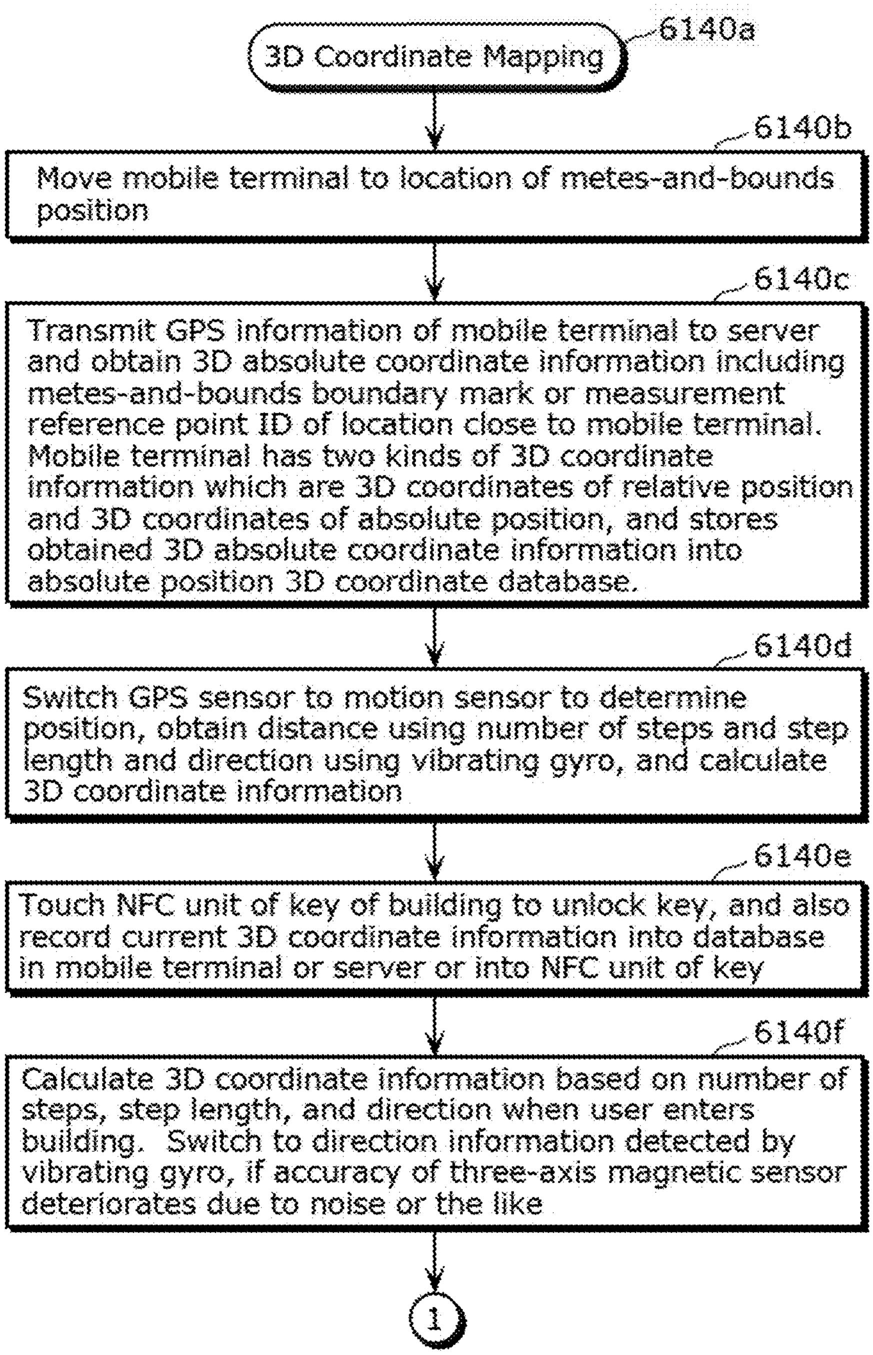

FIG. 242 is a flowchart of a position information registration method according to Embodiment 21 of the present invention.

Figure 243:
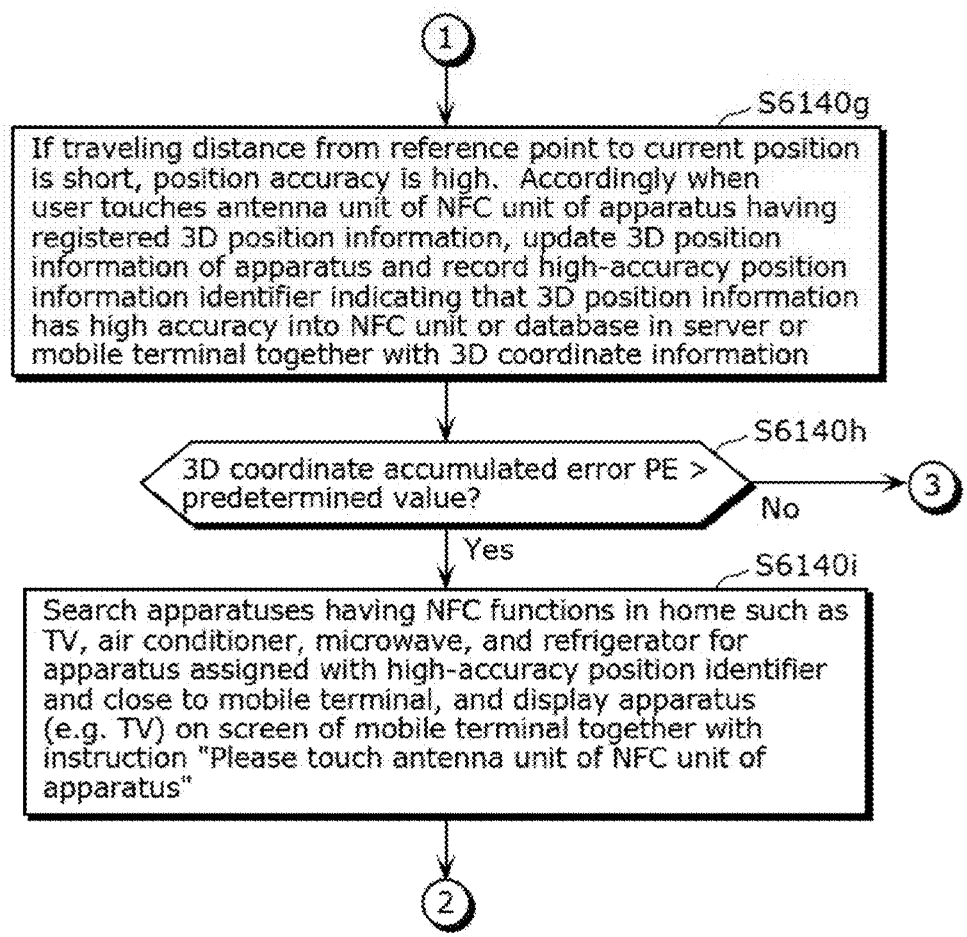

FIG. 243 is a flowchart of the position information registration method according to Embodiment 21 of the present invention.

Figure 244:
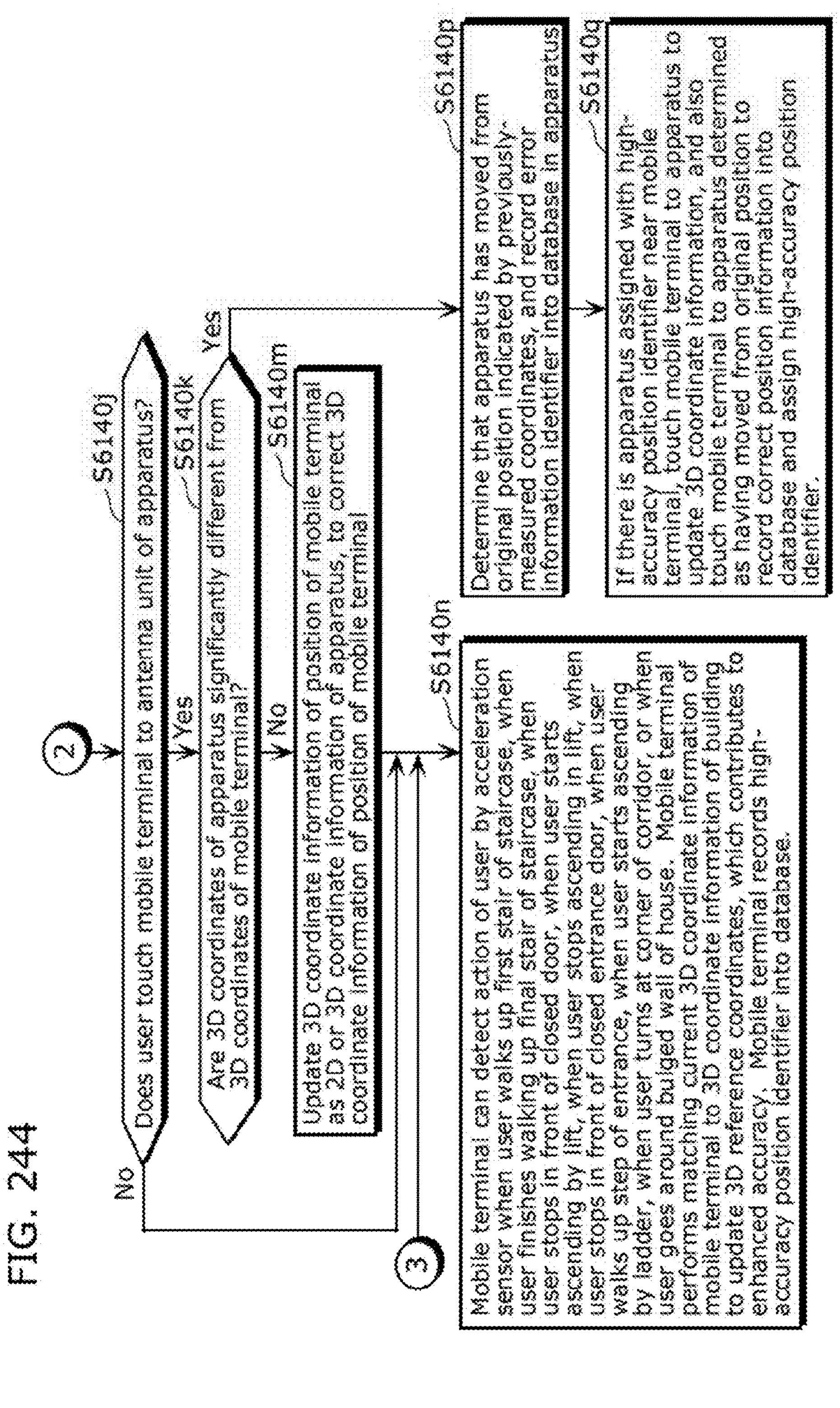

FIG. 244 is a flowchart of the position information registration method according to Embodiment 21 of the present invention.

Figure 245:
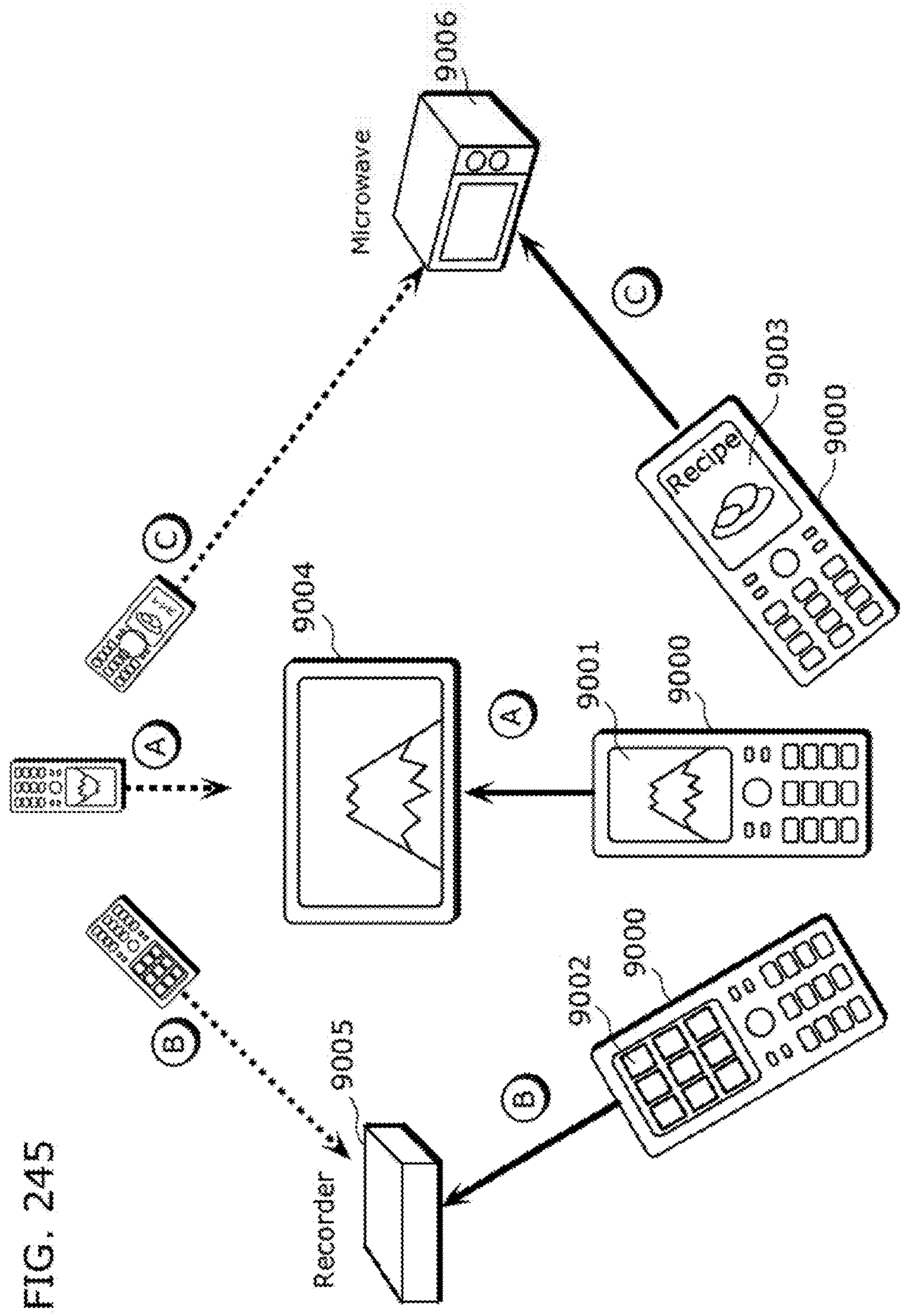

FIG. 245 is a diagram showing a device (apparatus) configuration according to Embodiment 22 of the present invention.

Figure 246:
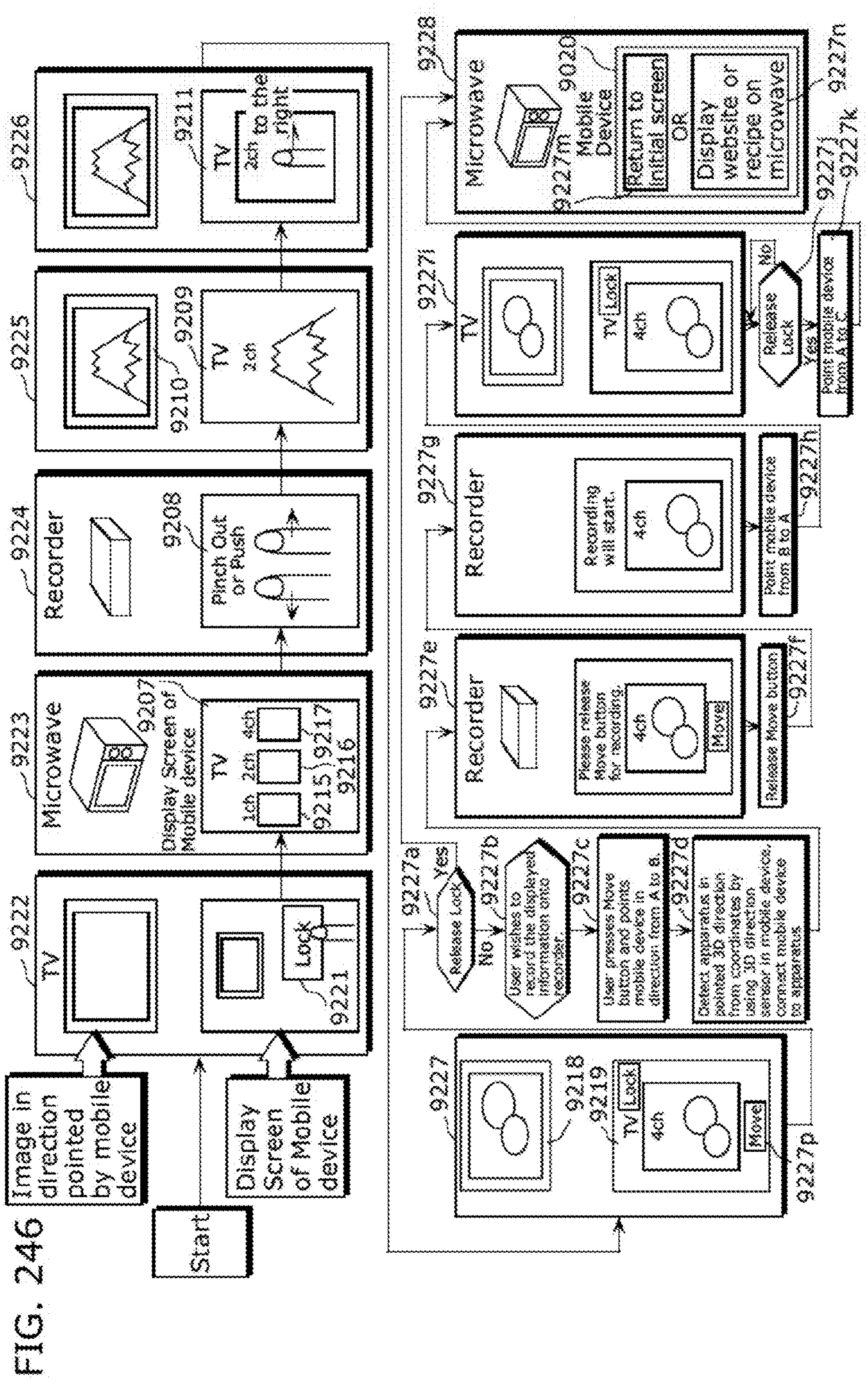

FIG. 246 is a diagram showing display screens of a mobile device and display screens of a cooperation apparatus, according to Embodiment 22 of the present invention.

Figure 247:
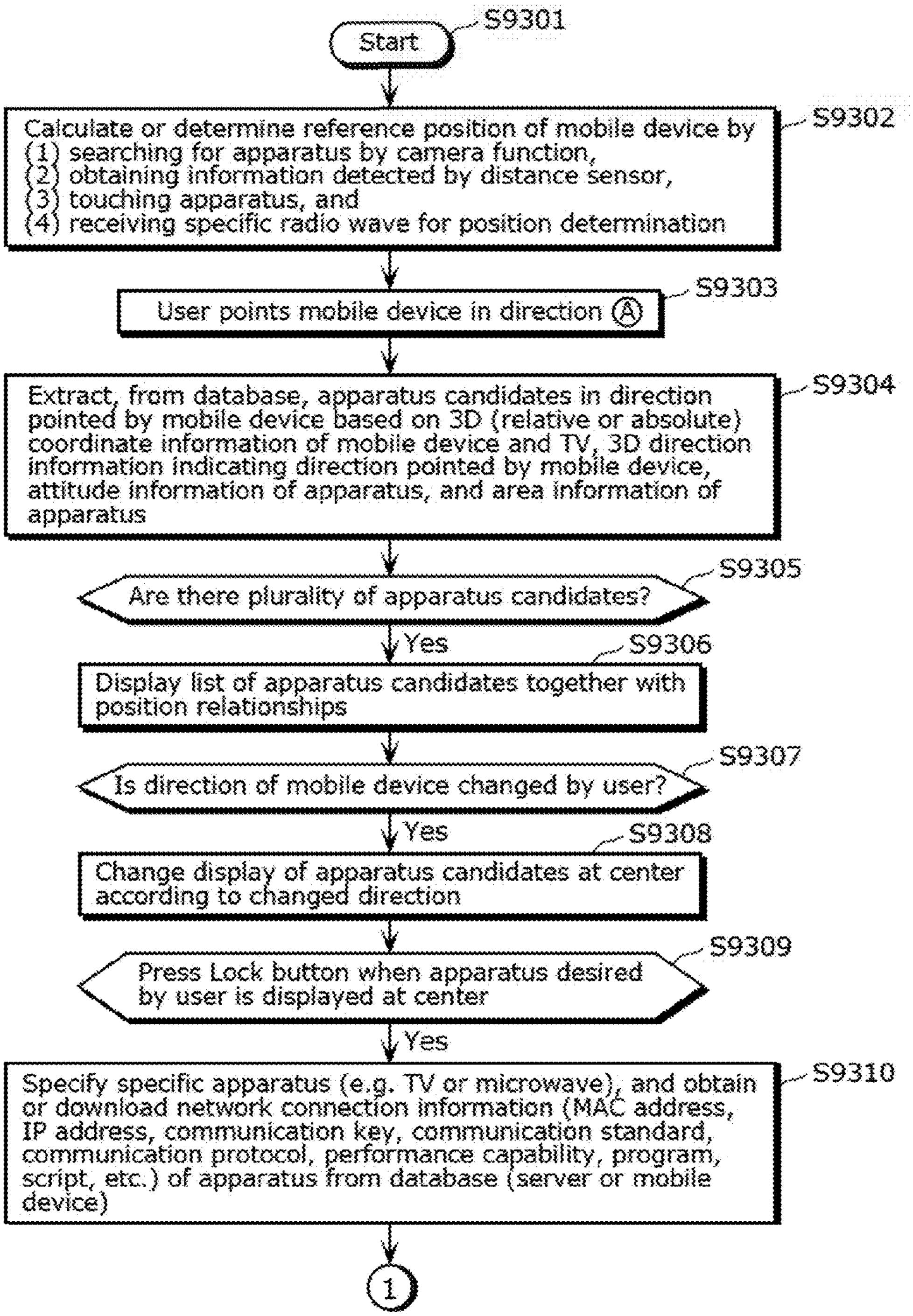

FIG. 247 is a flowchart of processing according to Embodiment 22 of the present invention.

Figure 248:
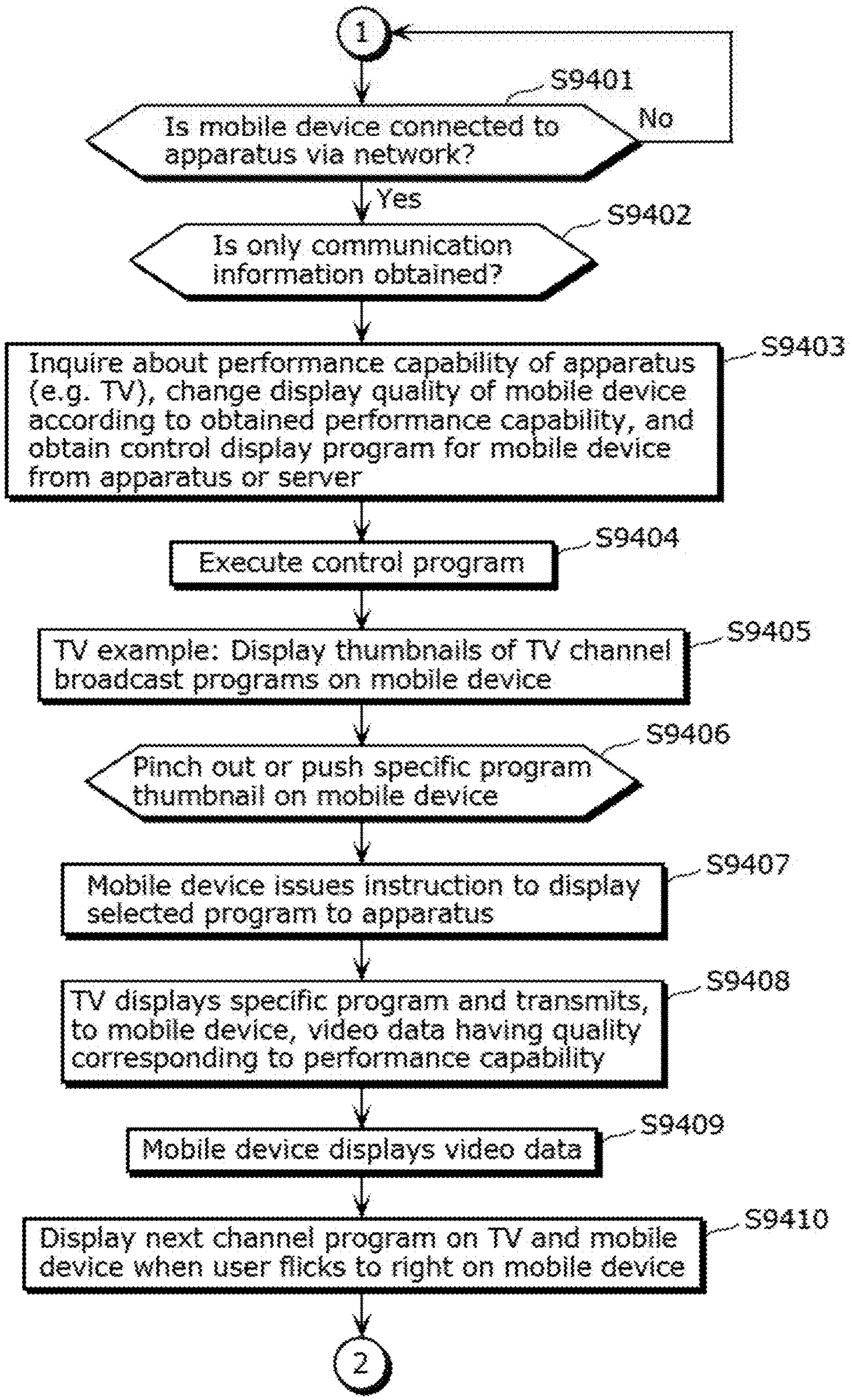

FIG. 248 is a flowchart of the processing according to Embodiment 22 of the present invention.

Figure 249:
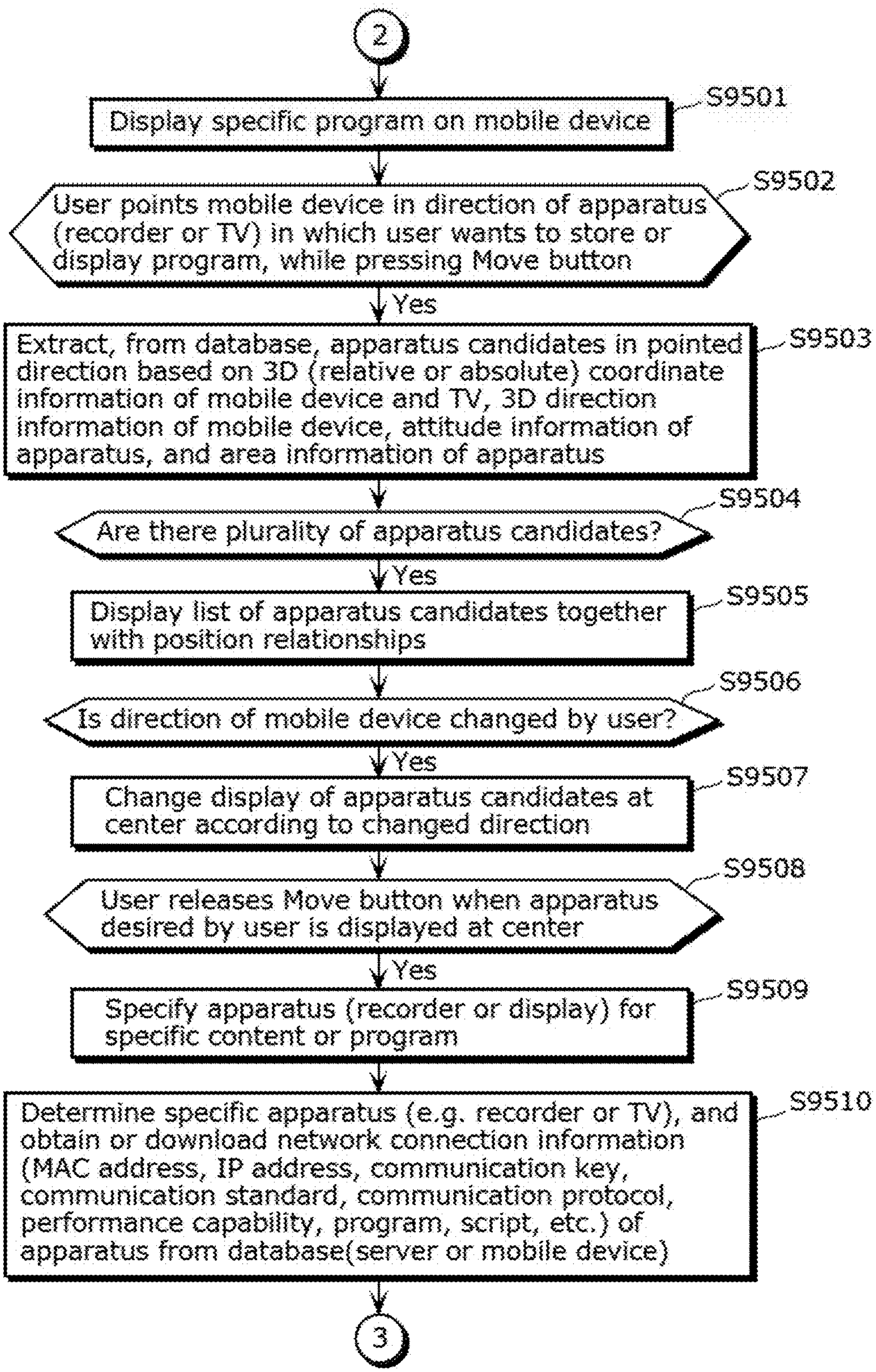

FIG. 249 is a flowchart of the processing according to Embodiment 22 of the present invention.

Figure 250:
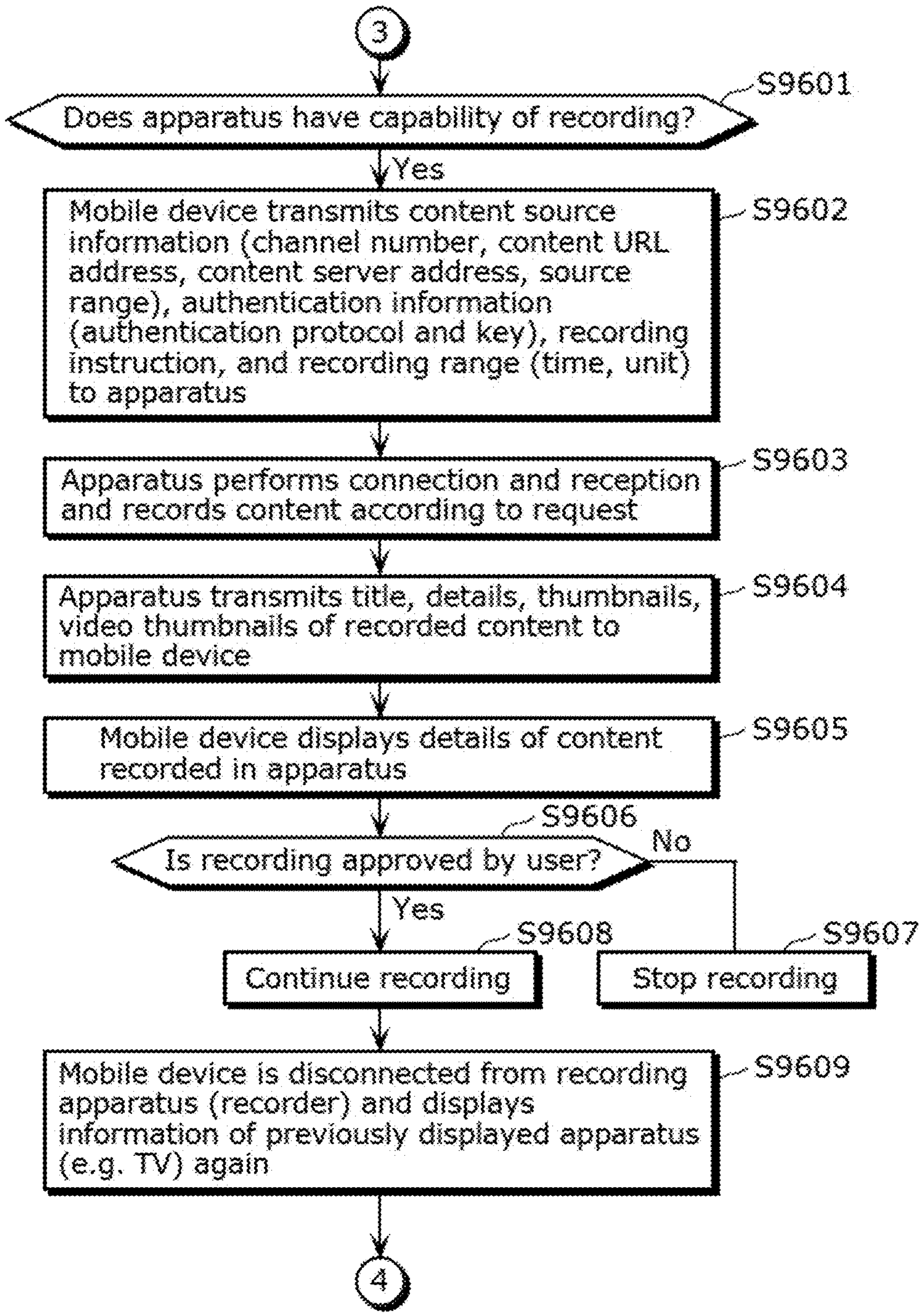

FIG. 250 is a flowchart of the processing according to Embodiment 22 of the present invention.

Figure 251:
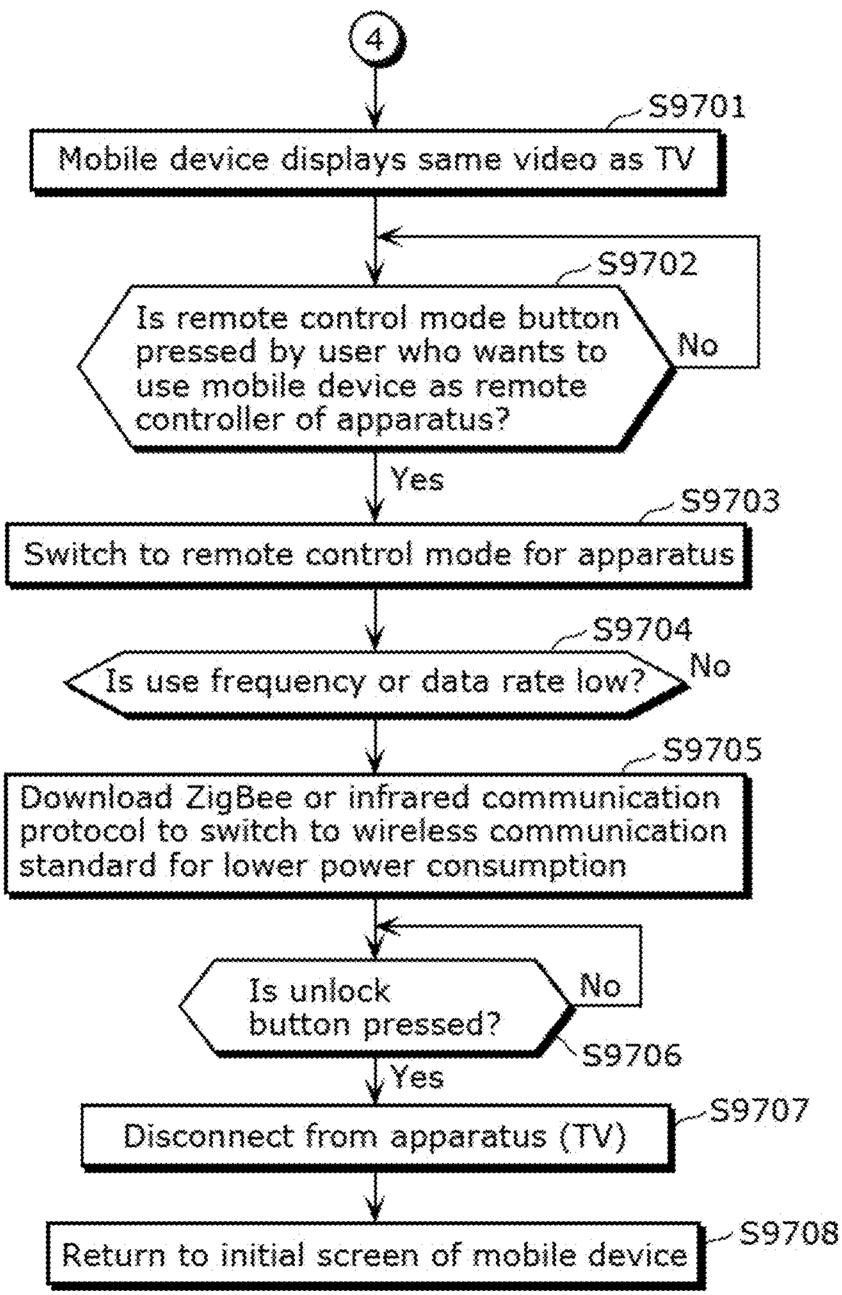

FIG. 251 is a flowchart of the processing according to Embodiment 22 of the present invention.

Figure 252:
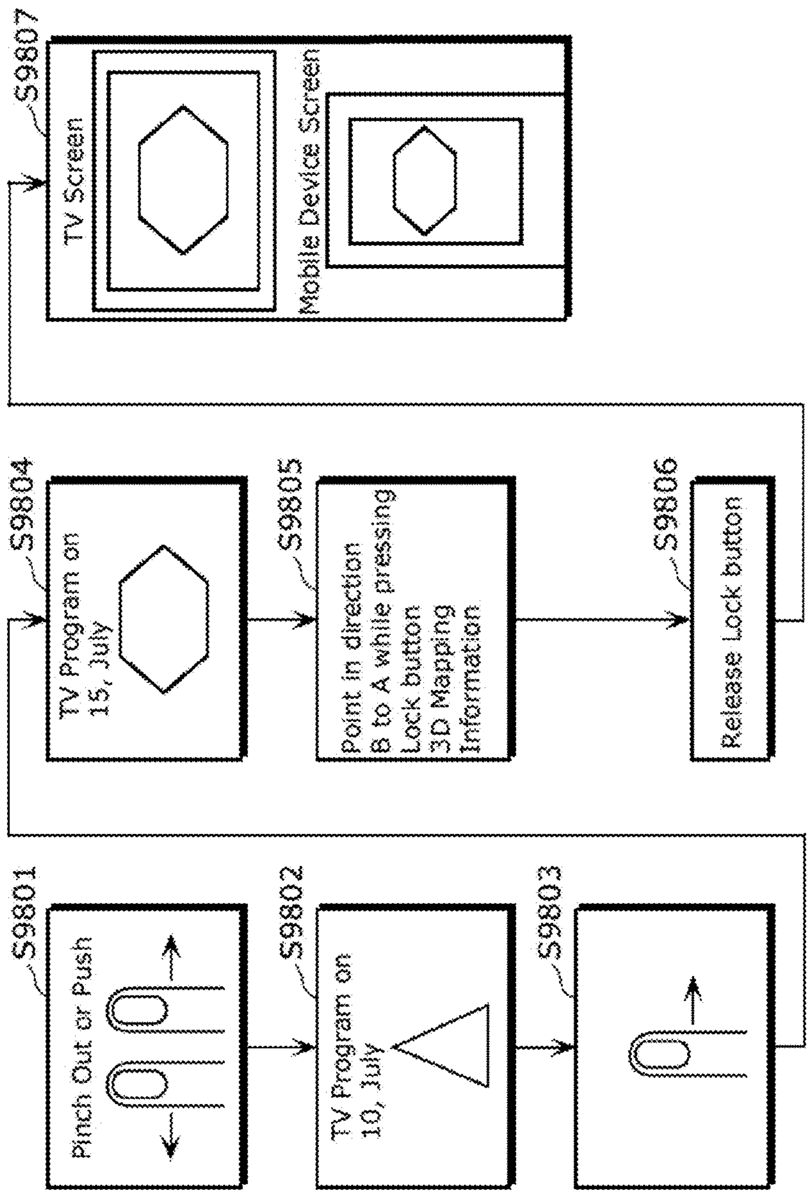

FIG. 252 is a flowchart of an example of displays of a mobile device 9000 and a cooperation apparatus, according to Embodiment 22 of the present invention.

Figure 253:
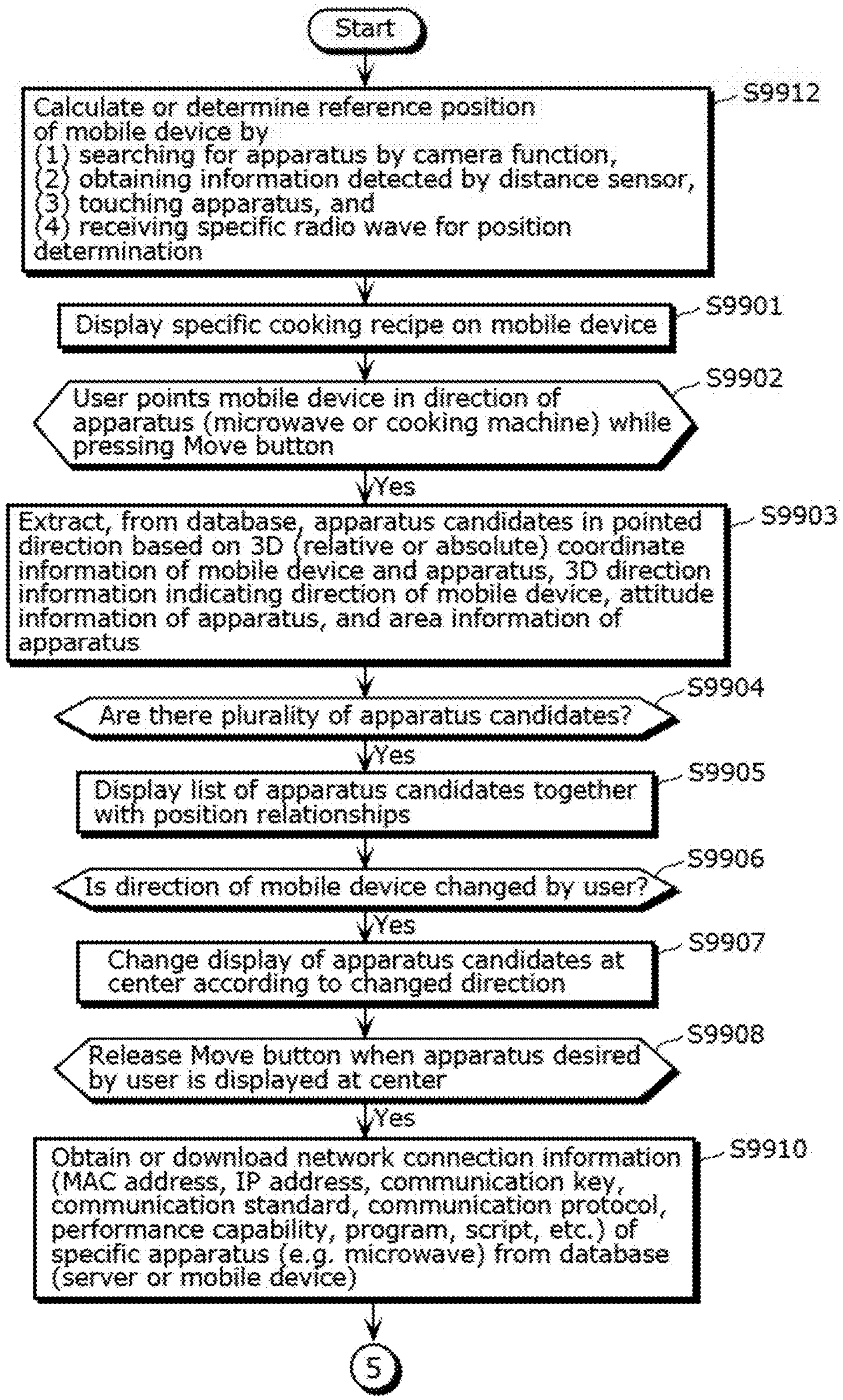

FIG. 253 is a flowchart of processing according to Embodiment 22 of the present invention.

Figure 254:
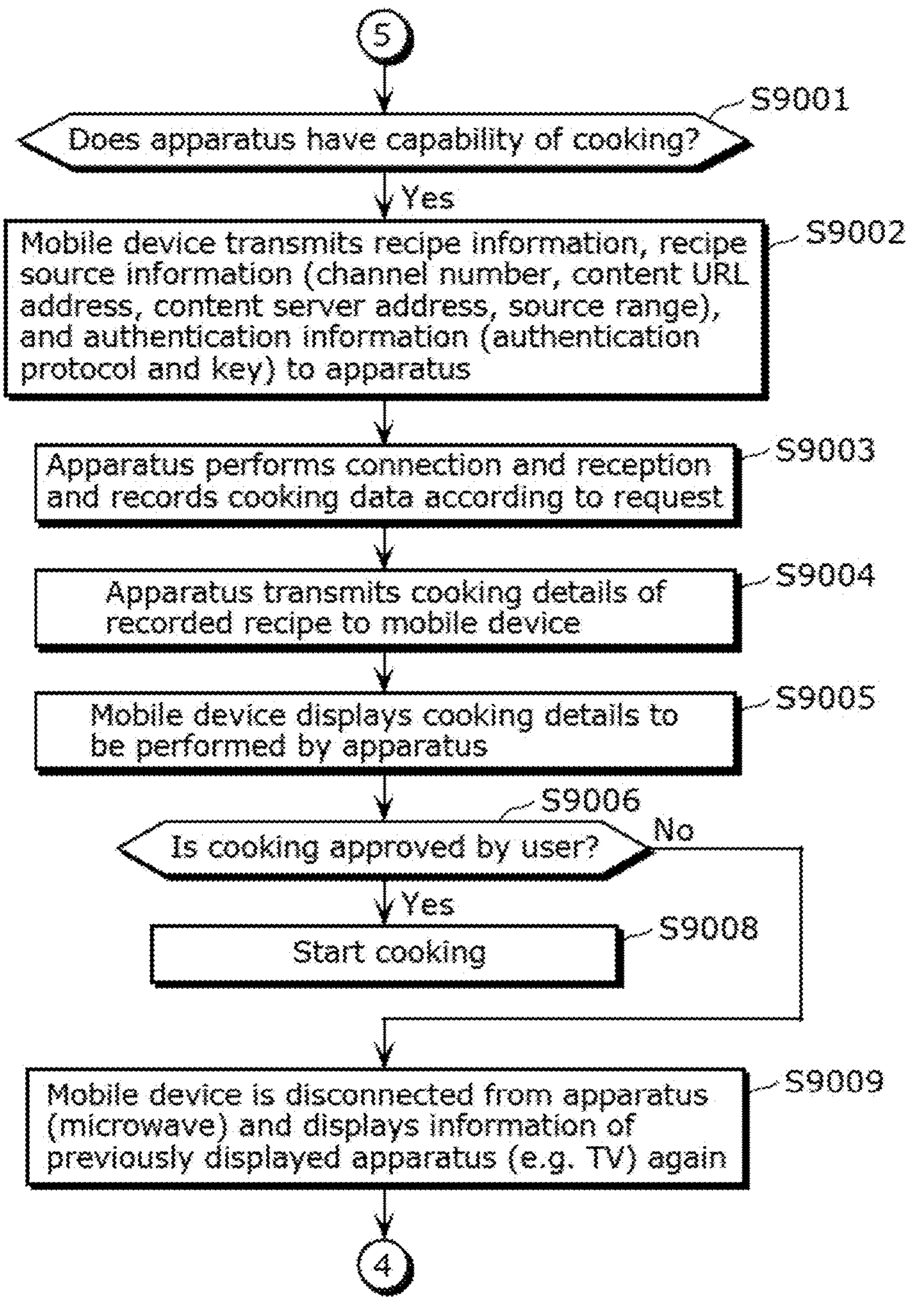

FIG. 254 is a flowchart of the processing according to Embodiment 22 of the present invention.

Figure 255:
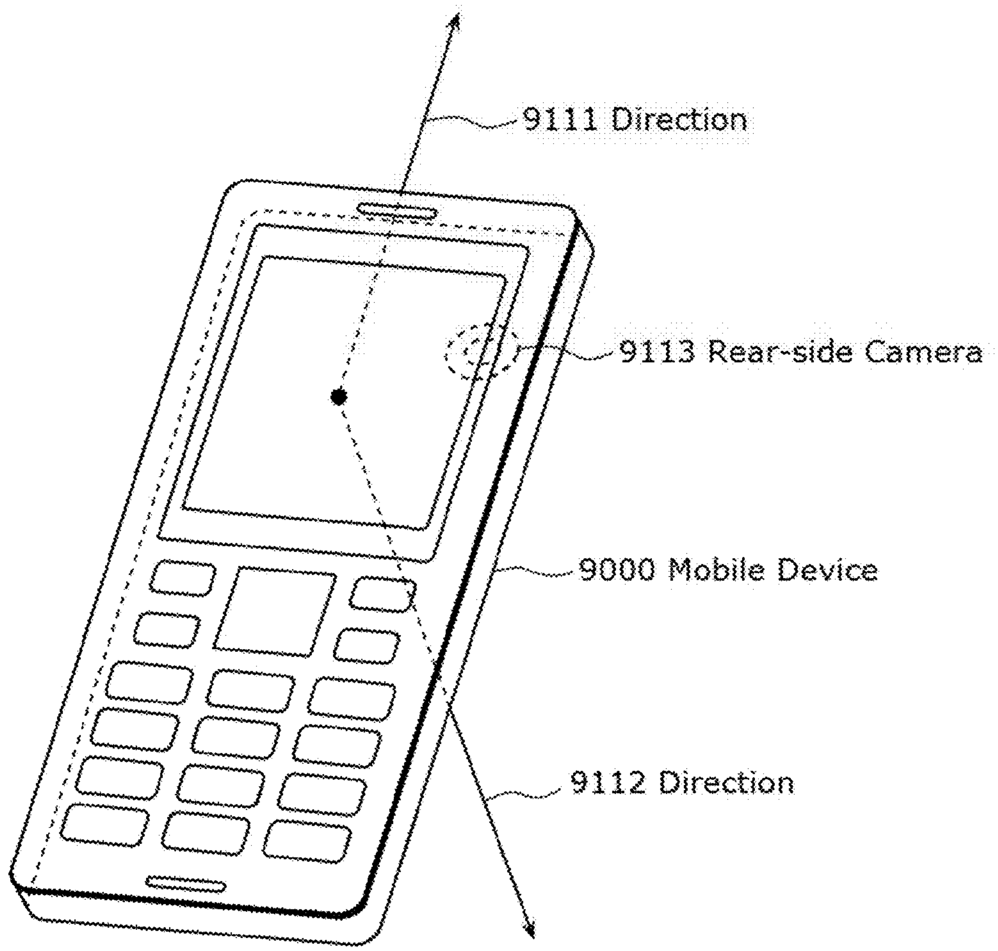

FIG. 255 is a schematic diagram of the mobile device according to Embodiment 22 of the present invention.

Figure 256:
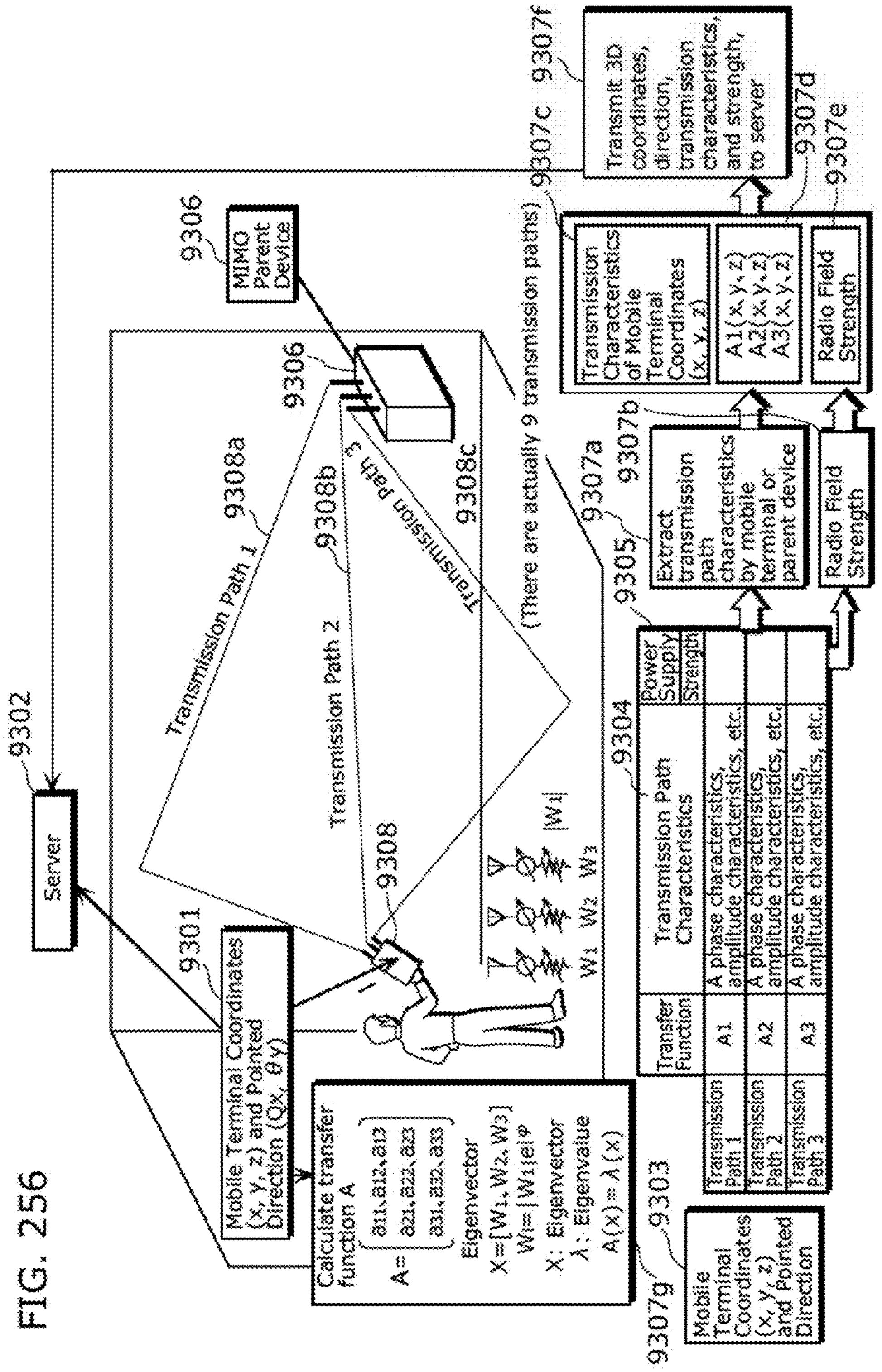

FIG. 256 is a diagram for explaining a communication method for establishing a plurality of transmission paths by using a plurality of antennas and performing transmission via the transmission paths.

Figure 257:
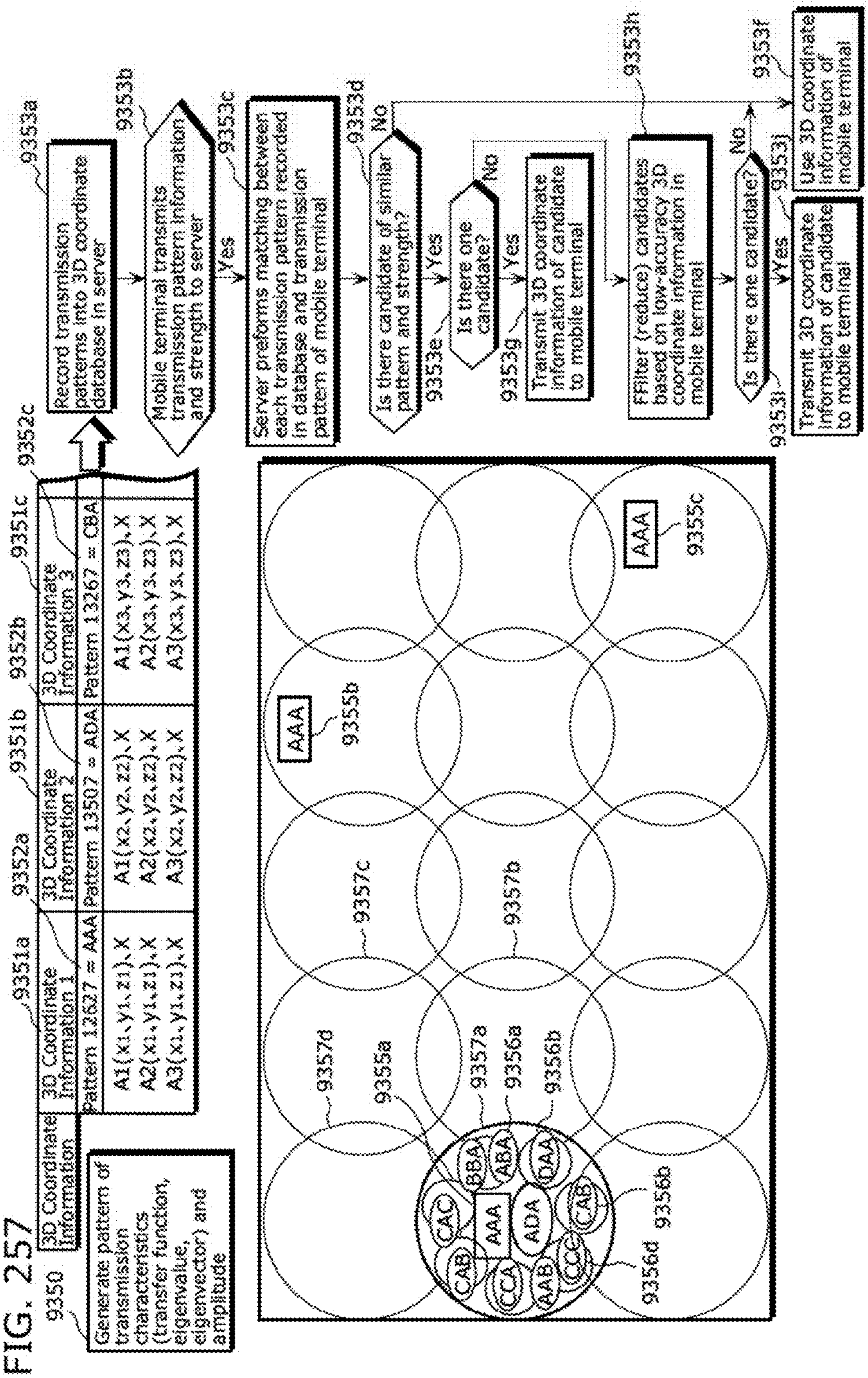

FIG. 257 is a flowchart for explaining a method for obtaining position information in the communication method using the transmission paths.

Figure 258:
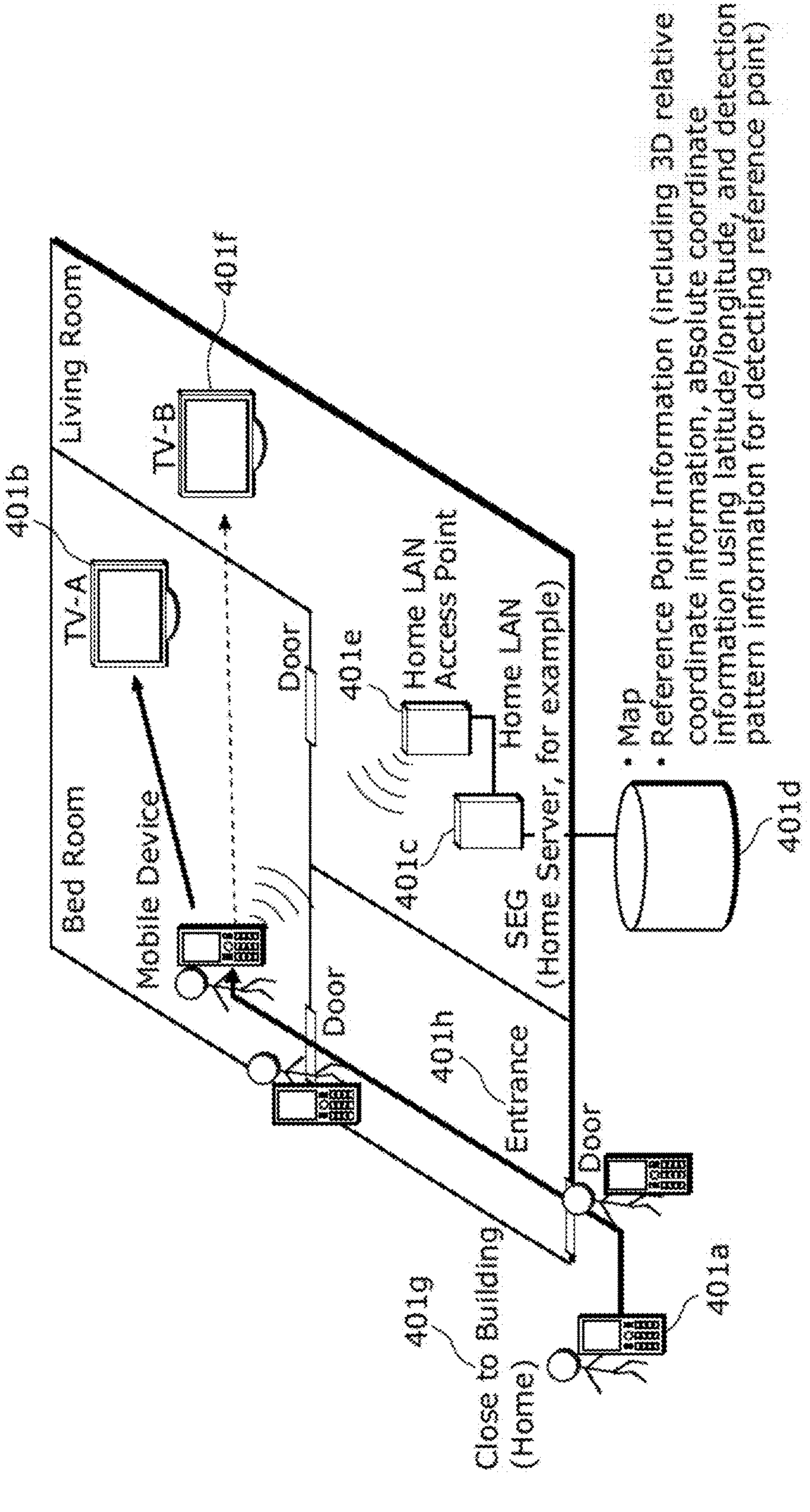

FIG. 258 is a diagram showing an example of apparatuses related to moves of a mobile device near and inside a building (user's home), according to Embodiment 23 of the present invention.

Figure 259:
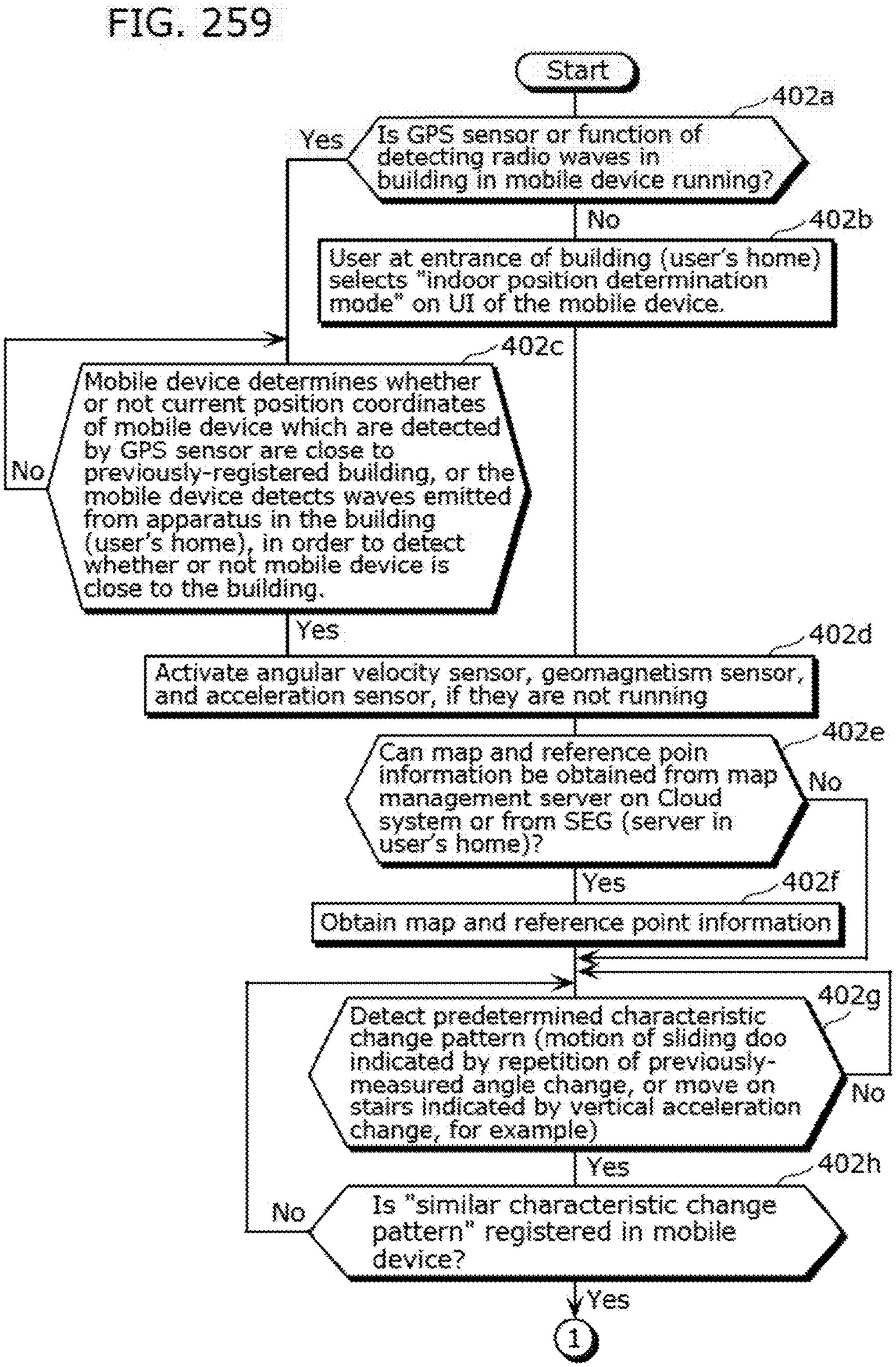

FIG. 259 is a flowchart of processing of determining a position of a mobile device in the building, according to Embodiment 23 of the present invention.

Figure 260:
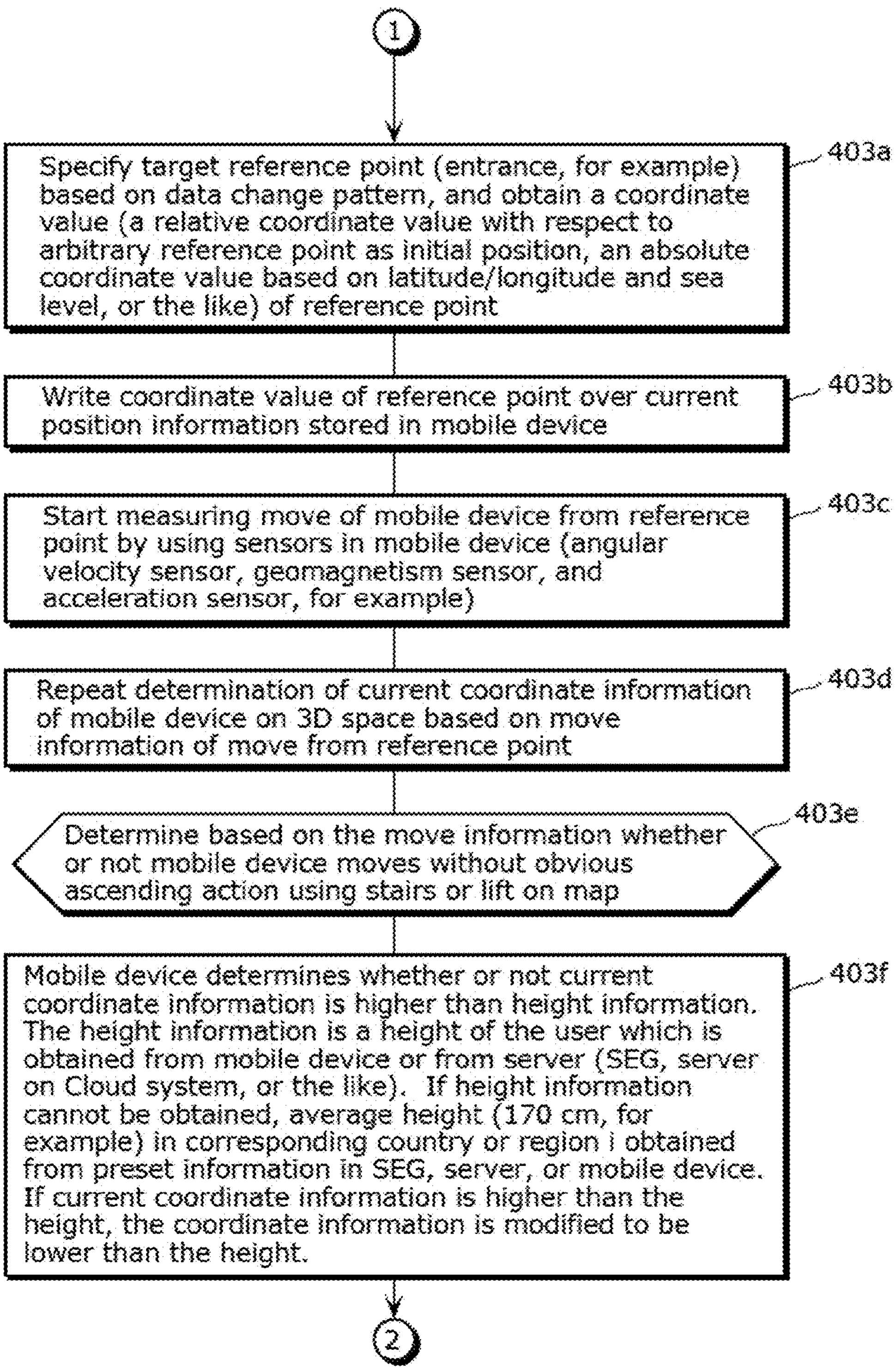

FIG. 260 is a flowchart of processing of determining a position of the mobile device in the building, according to Embodiment 23 of the present invention.

Figure 261:
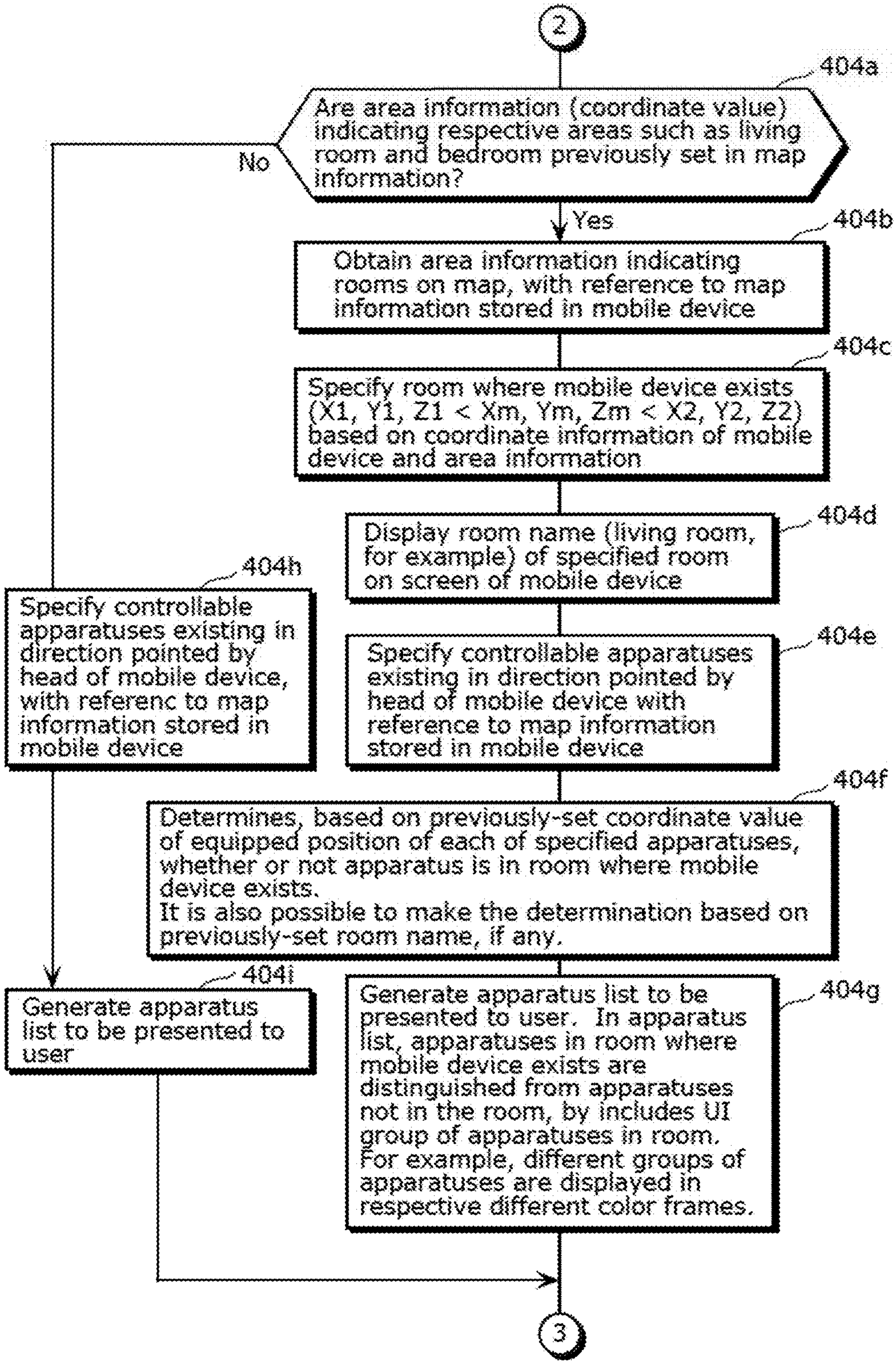

FIG. 261 is a flowchart of processing of determining a position of the mobile device in the building, according to Embodiment 23 of the present invention.

Figure 262:
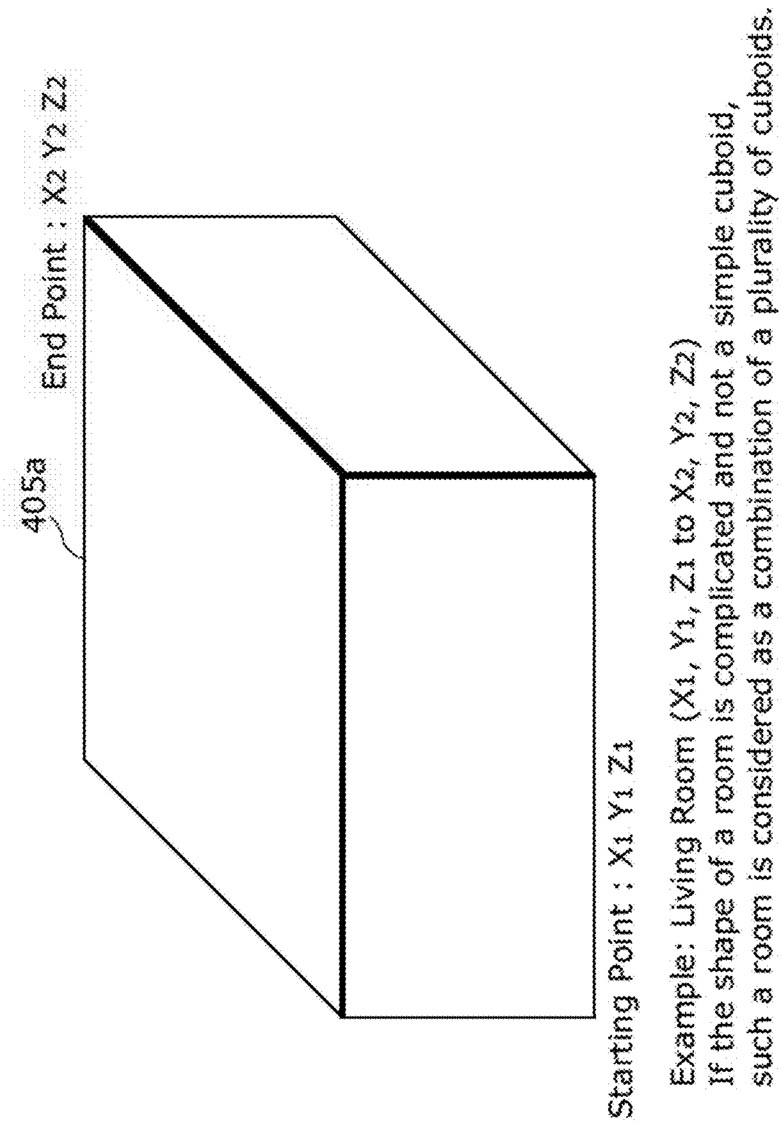

FIG. 262 is a diagram showing an example of information indicating an area of a room on a 3D map according to Embodiment 23 of the present invention.

Figure 263:
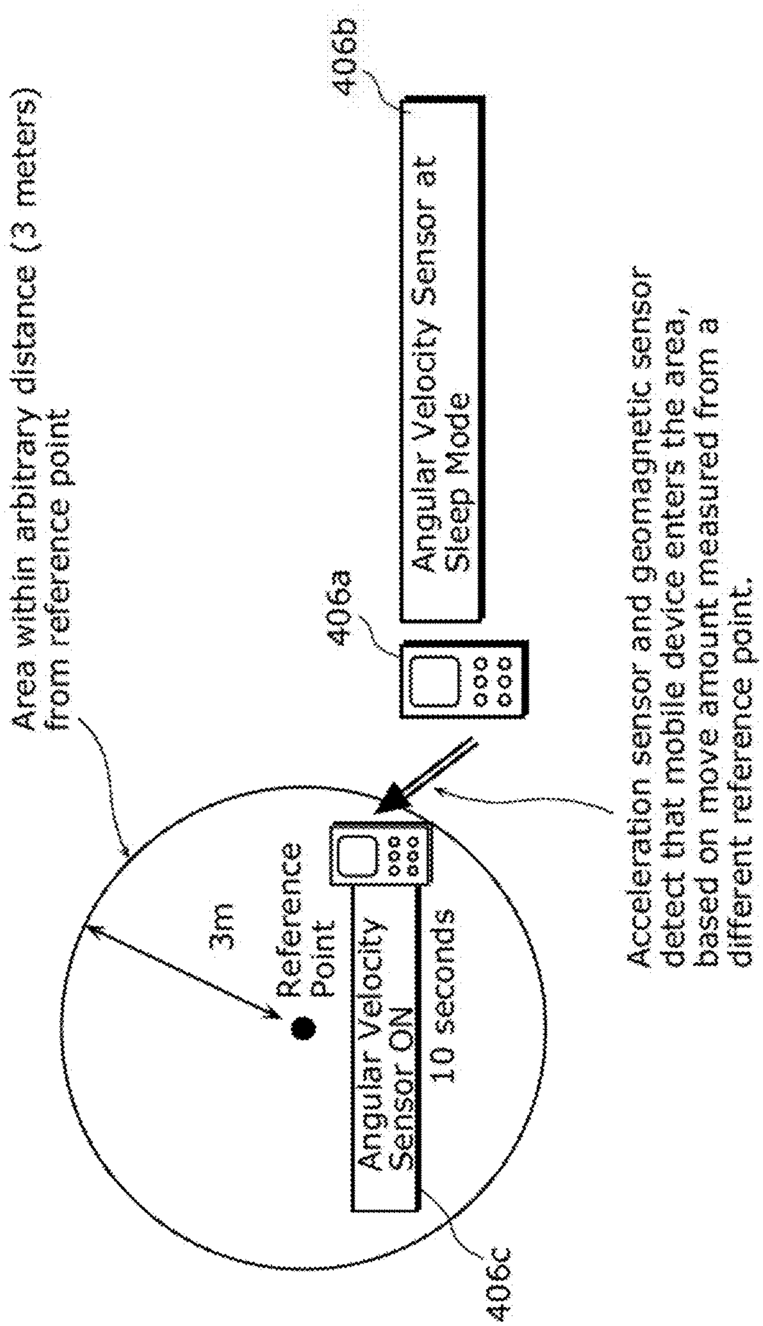

FIG. 263 is a diagram showing a move of the mobile device near a reference point according to Embodiment 23 of the present invention.

Figure 264:
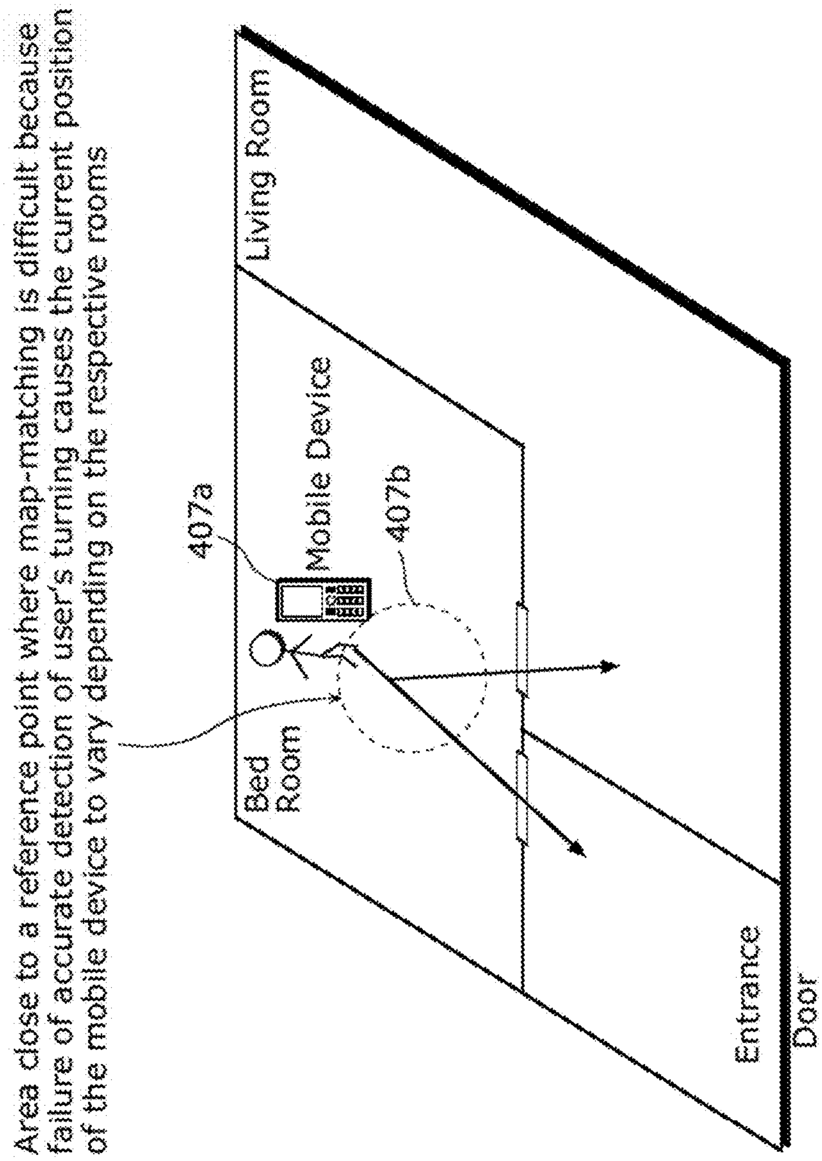

FIG. 264 is a diagram showing a location to be detected with a high accuracy in a direction of moving the mobile device, according to Embodiment 23 of the present invention.

Figure 265:
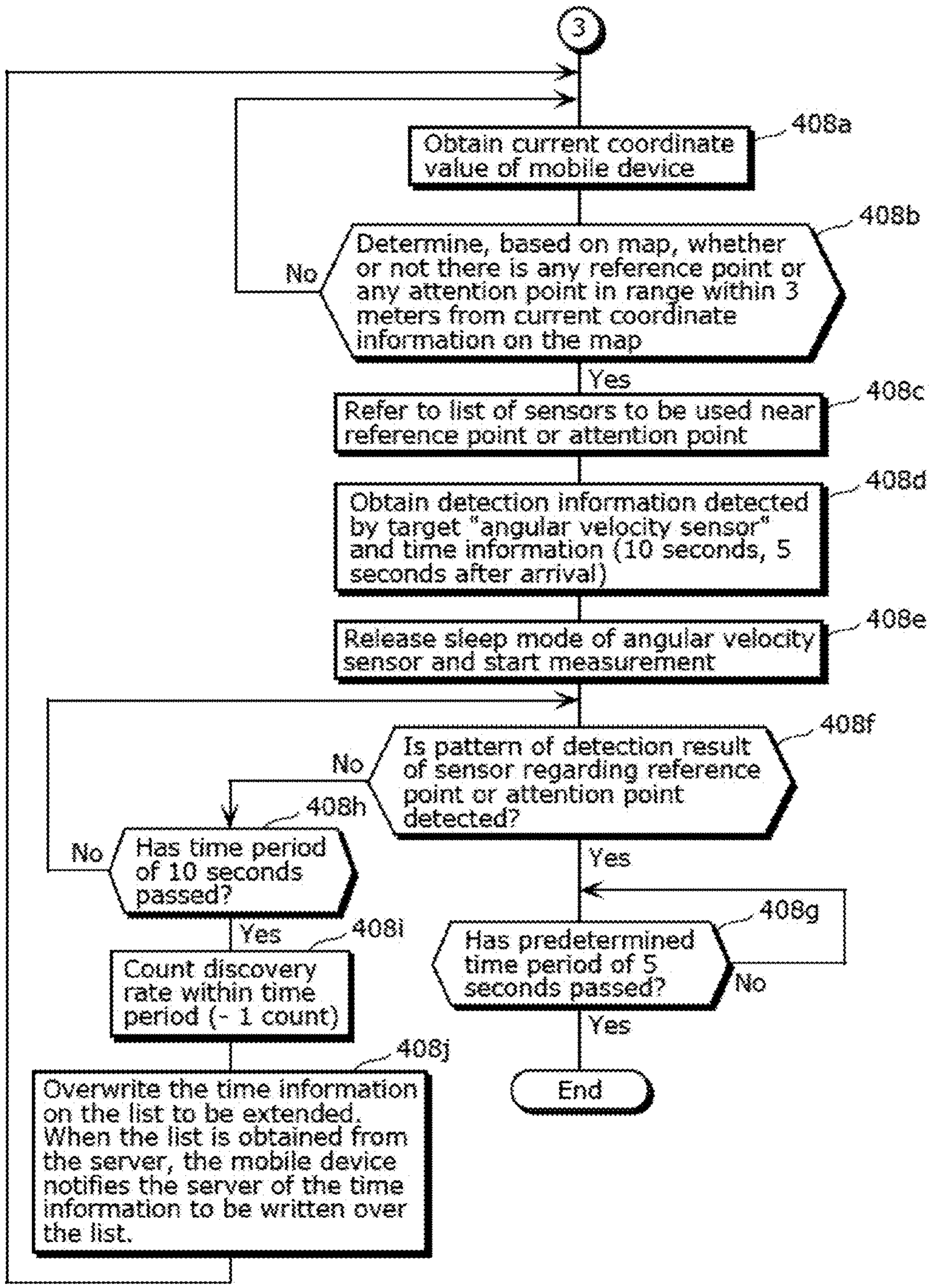

FIG. 265 is a flowchart of processing of determining a position of the mobile device in the building, according to Embodiment 23 of the present invention.

FIG. 266 is a table of moves of the mobile device near reference points and an attention point, according to Embodiment 23 of the present invention.

Figure 267:
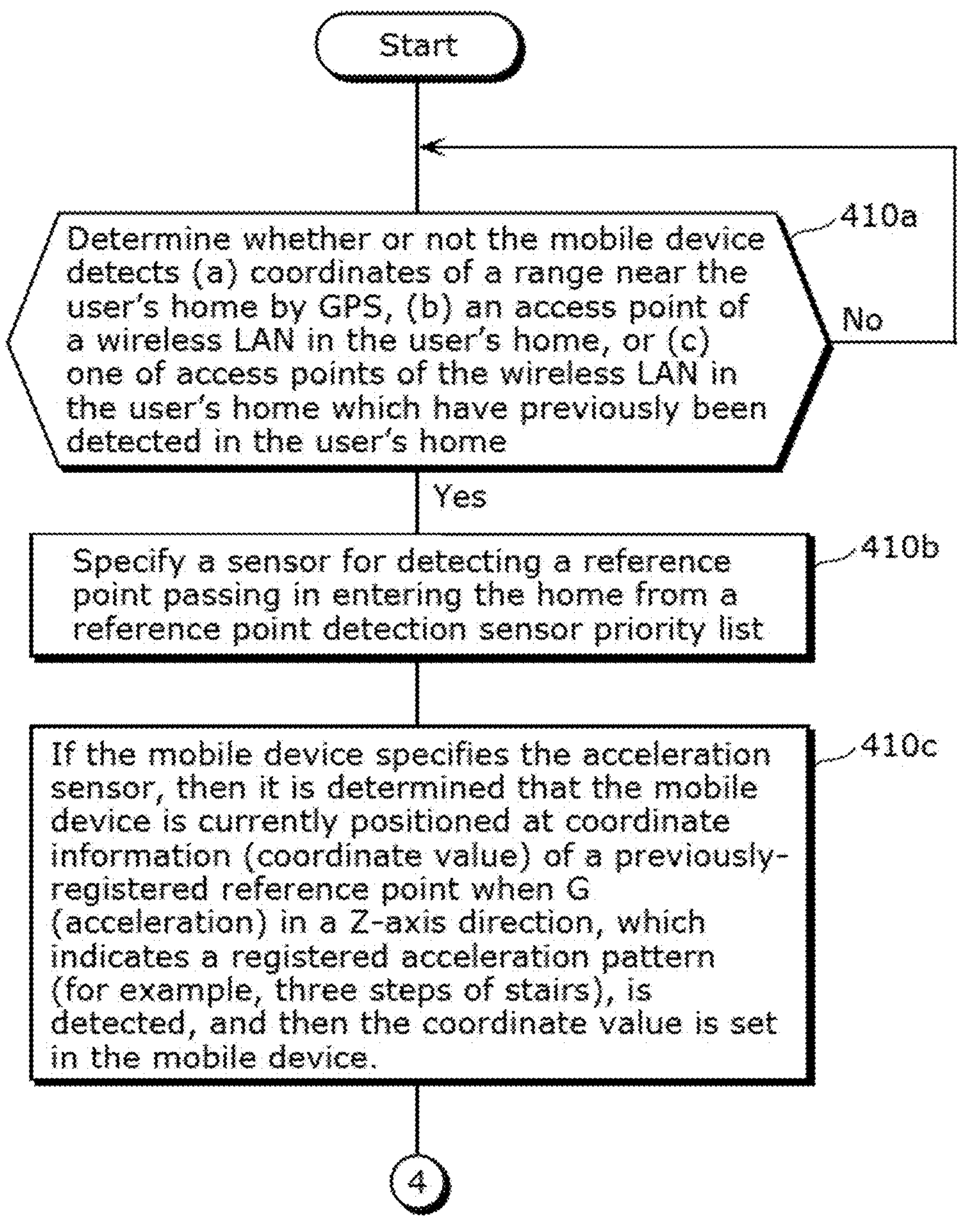

FIG. 267 is a flowchart of processing of determining a position of the mobile device in the building, according to Embodiment 23 of the present invention.

FIG. 268 is a list indicating priorities of sensors for detecting each of reference points, according to Embodiment 23 of the present invention.

Figure 269:
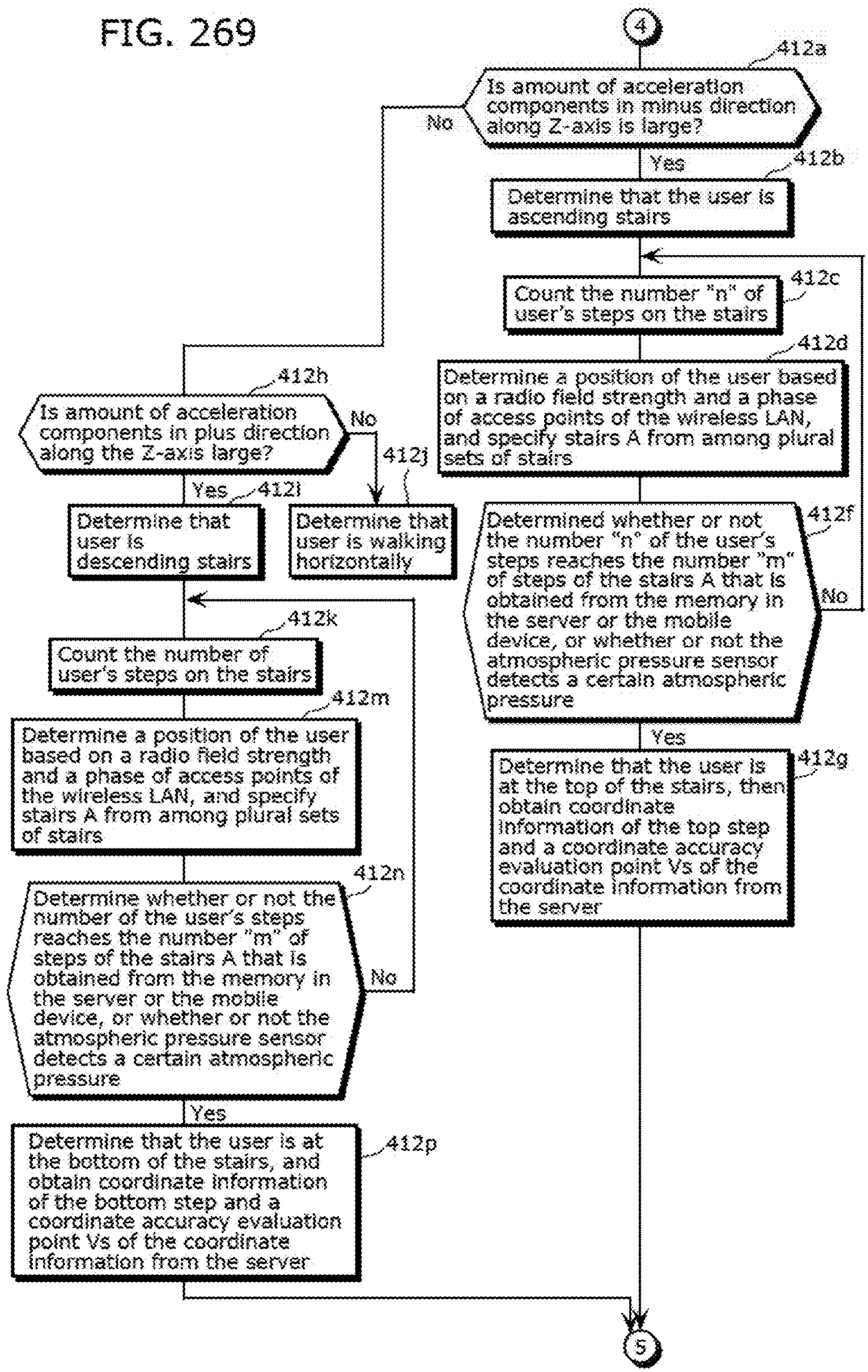

FIG. 269 is a flowchart of processing of determining a position of the mobile device in the building, according to Embodiment 23 of the present invention.

Figure 270:
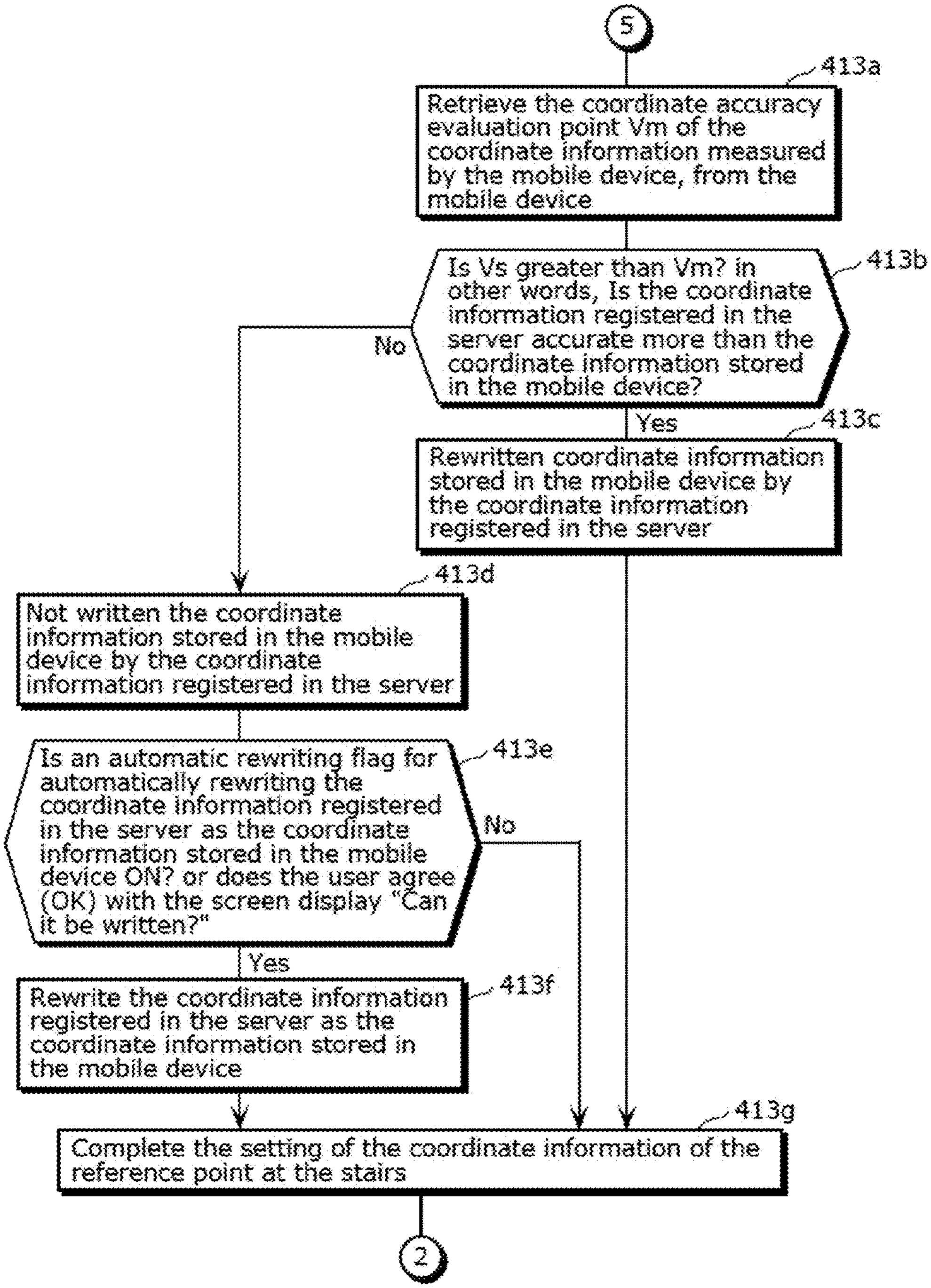

FIG. 270 is a flowchart of processing of determining a position of the mobile device in the building, according to Embodiment 23 of the present invention.

Figure 271:
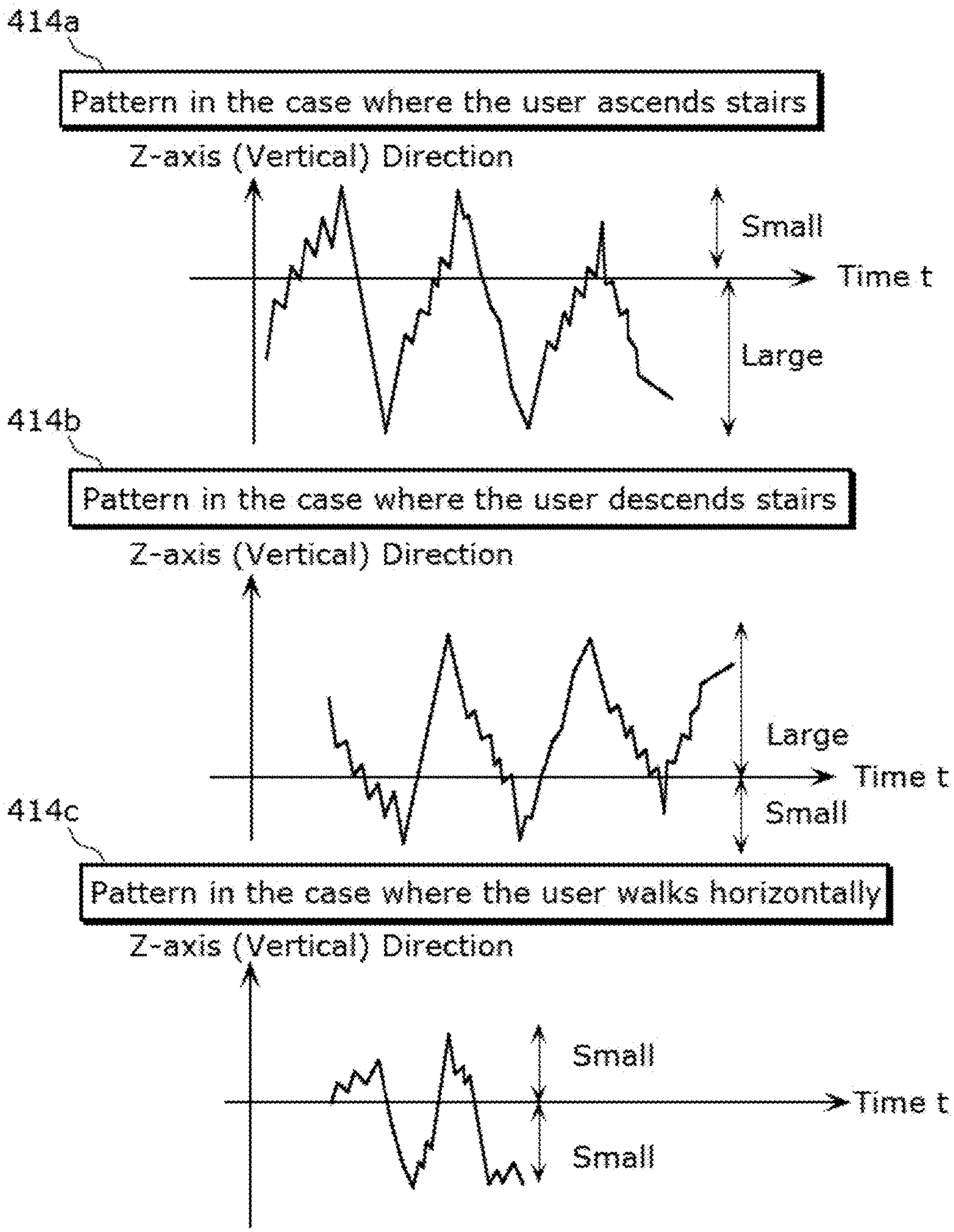

FIG. 271 shows graphs each indicating detection data in a Z-axis (vertical) direction of an acceleration sensor, according to Embodiment 23 of the present invention.

Figure 272:
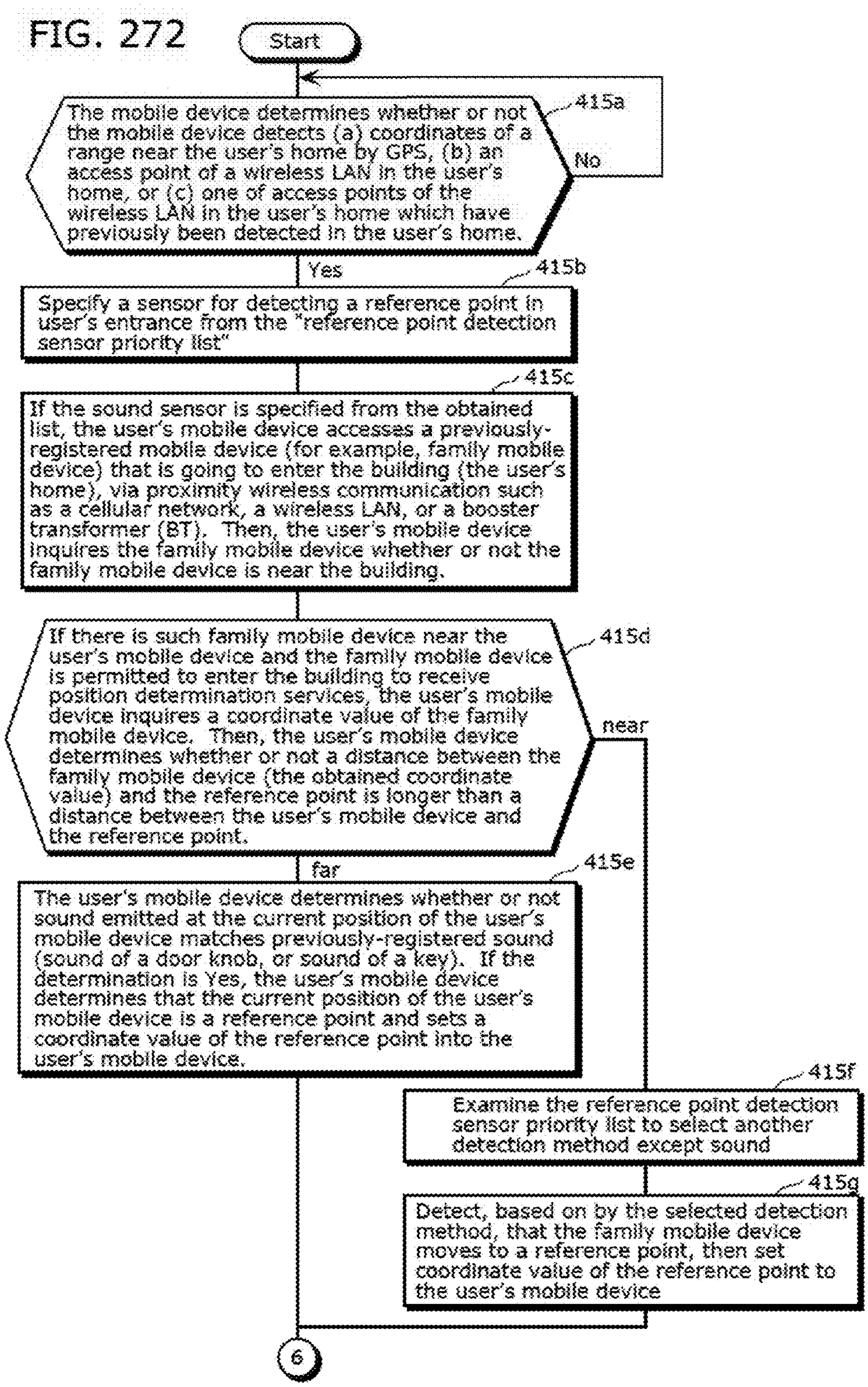

FIG. 272 is a flowchart of processing of determining a position of the mobile device in the building, according to Embodiment 23 of the present invention.

Figure 273:
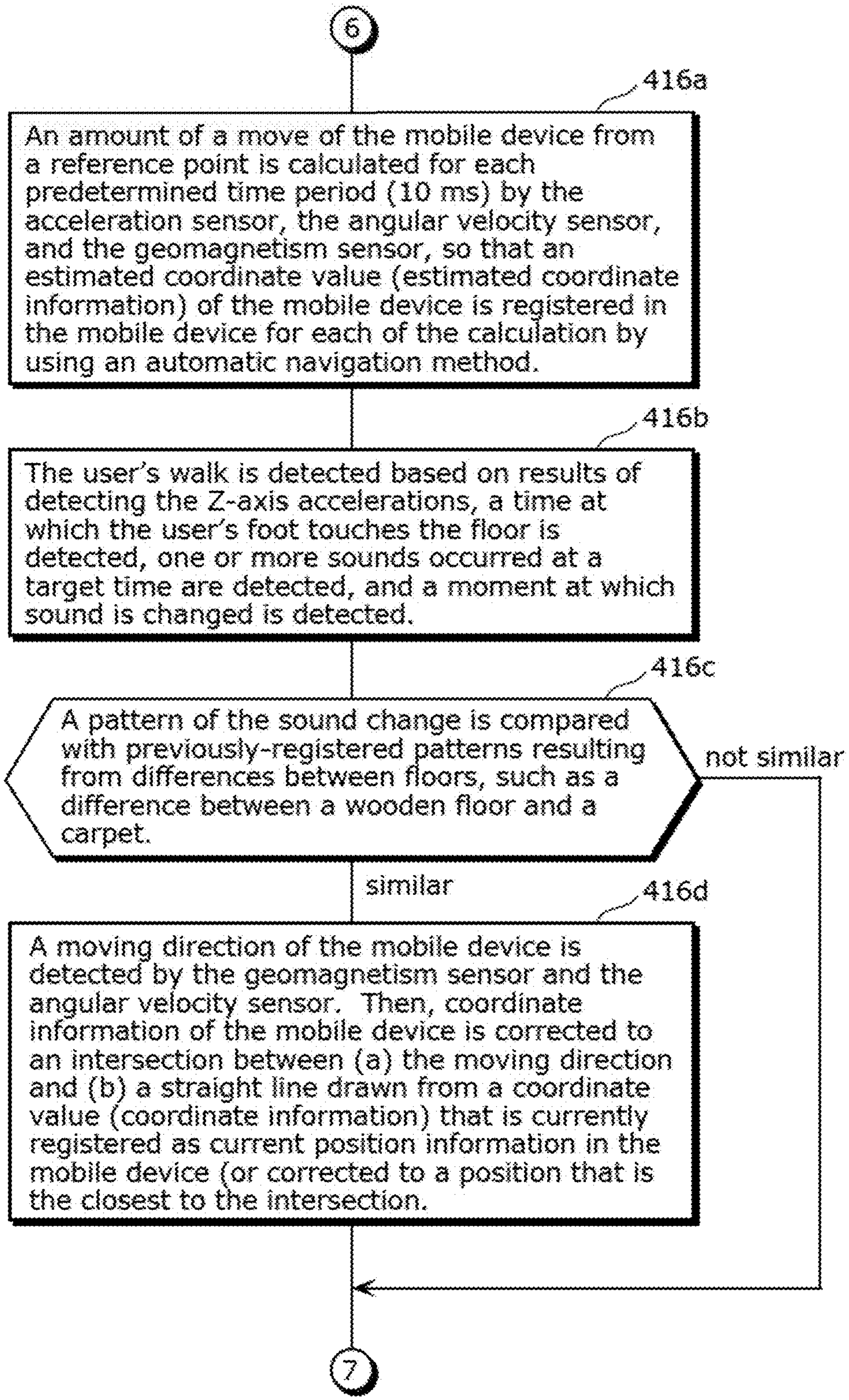

FIG. 273 is a flowchart of processing of determining a position of the mobile device in the building, according to Embodiment 23 of the present invention.

Figure 274:
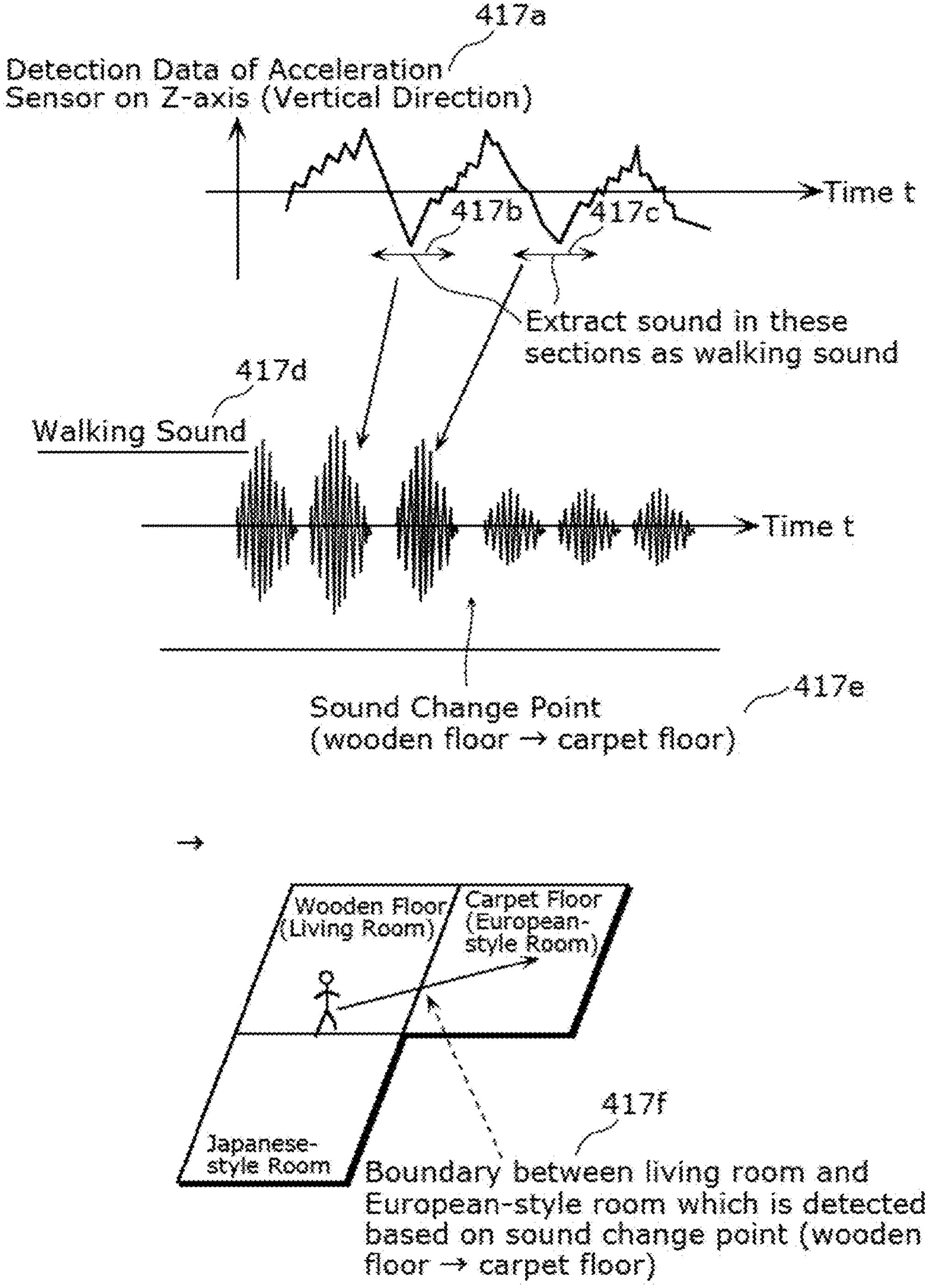

FIG. 274 shows graphs and a diagram for showing a relationship between detection data and walking sound in the acceleration Z-axis (vertical) direction, according to Embodiment 23 of the present invention.

Figure 275:
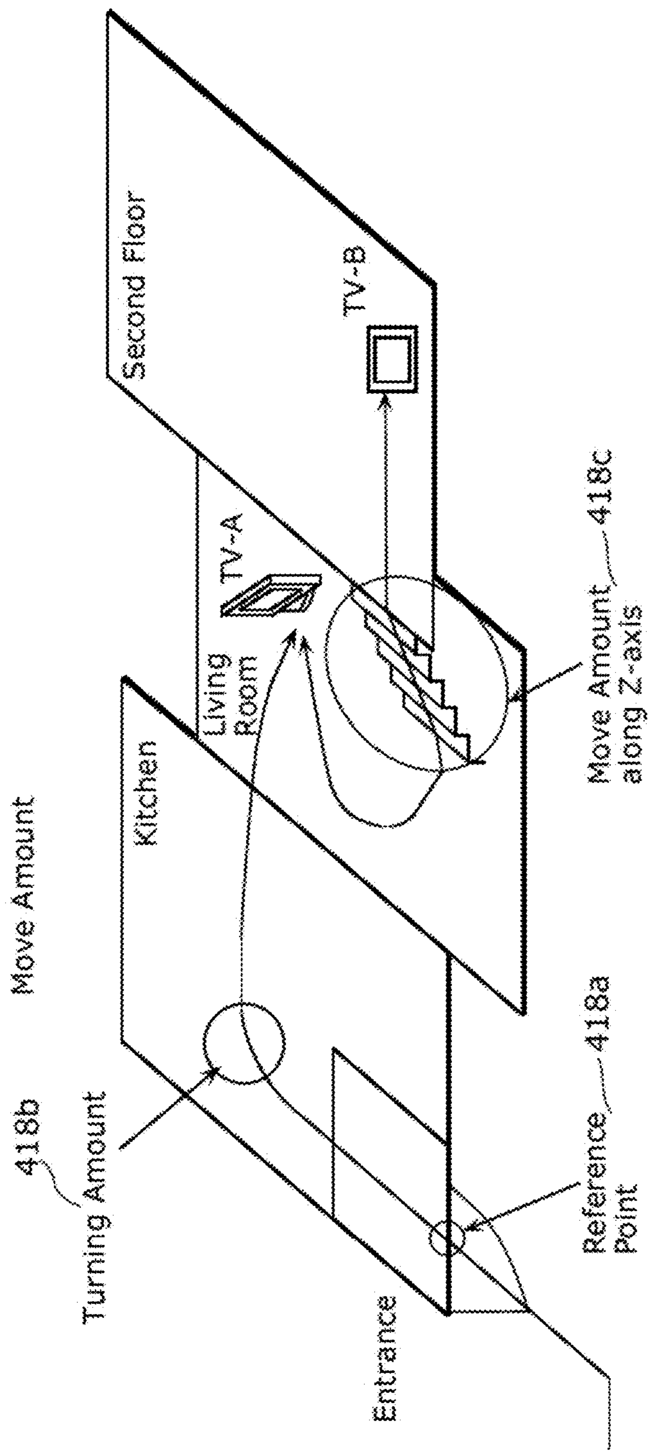

FIG. 275 shows a diagram showing an example of moves in the building, according to Embodiment 23 of the present invention.

FIG. 276 is a table indicating a path from a reference point to a next reference point, according to Embodiment 23 of the present invention.

Figure 277:
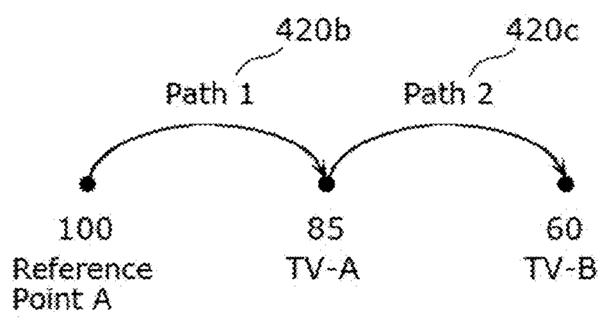

FIG. 277 shows a table and a diagram for explaining original reference point accuracy information, according to Embodiment 23 of the present invention.

Figure 278:
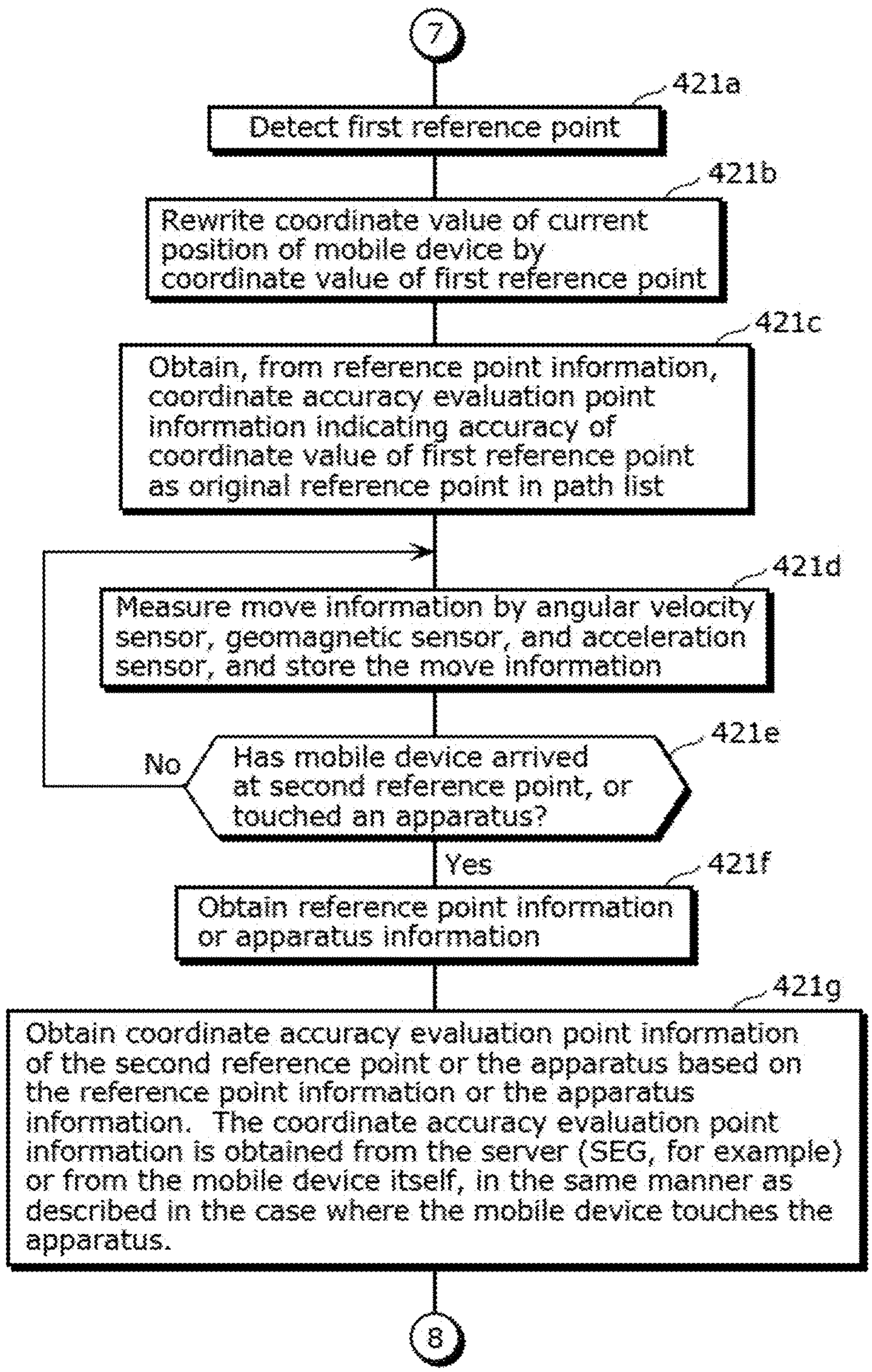

FIG. 278 is a flowchart of processing of determining a position of the mobile device in the building, according to Embodiment 23 of the present invention.

Figure 279:
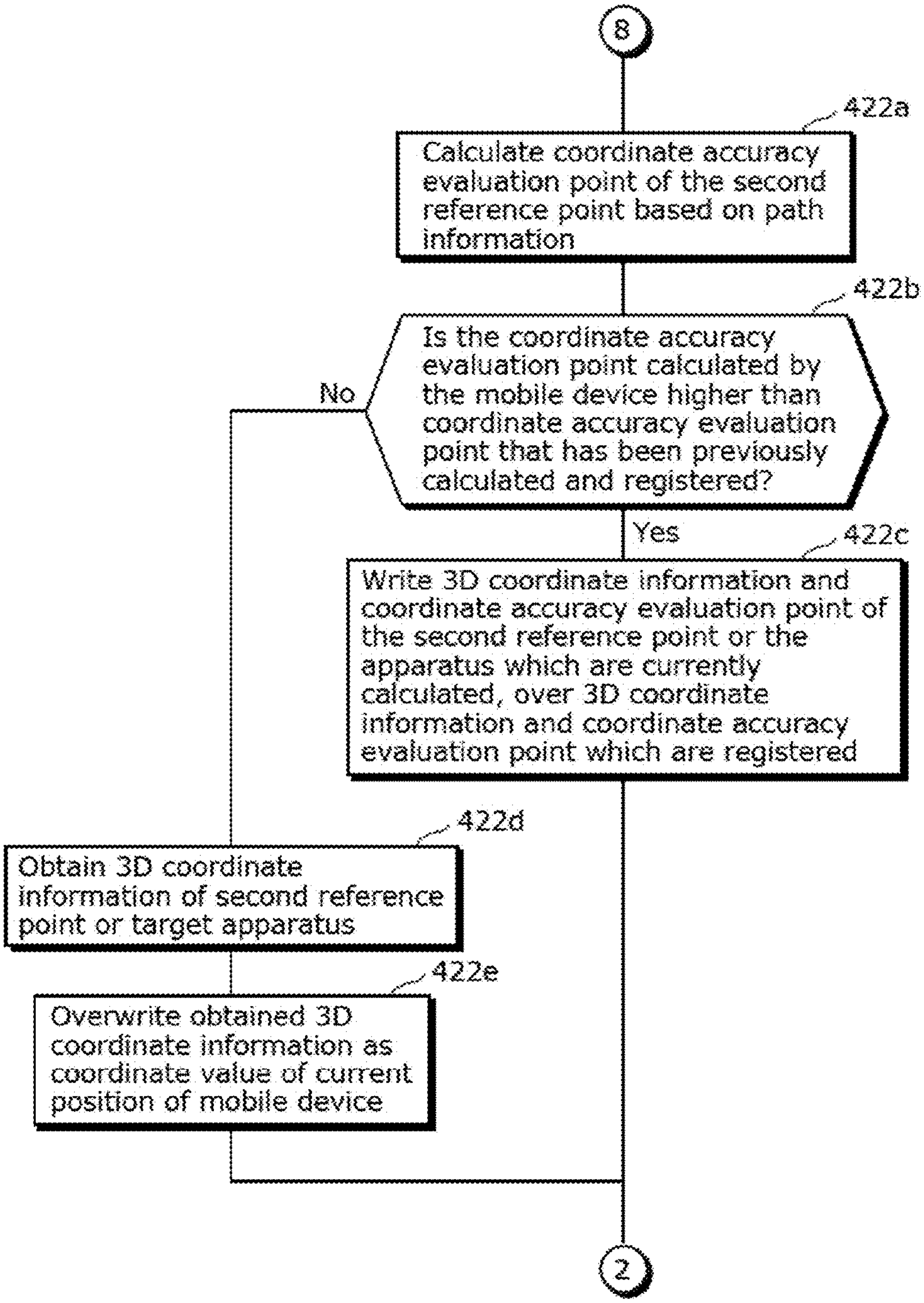

FIG. 279 is a flowchart of processing of determining a position of the mobile device in the building, according to Embodiment 23 of the present invention.

Figure 280:
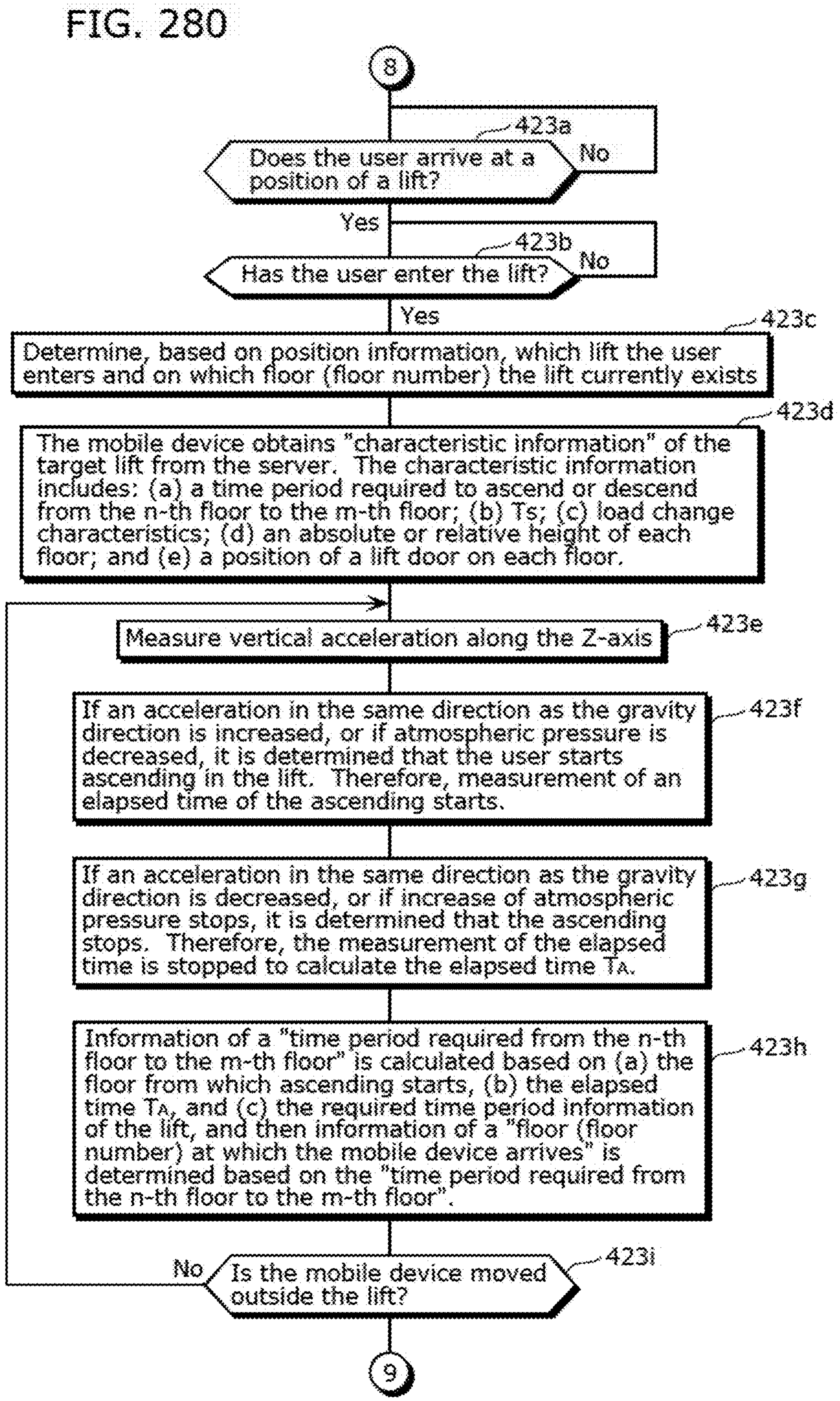

FIG. 280 is a flowchart of processing of determining a position of the mobile device in the building, according to Embodiment 23 of the present invention.

Figure 281:
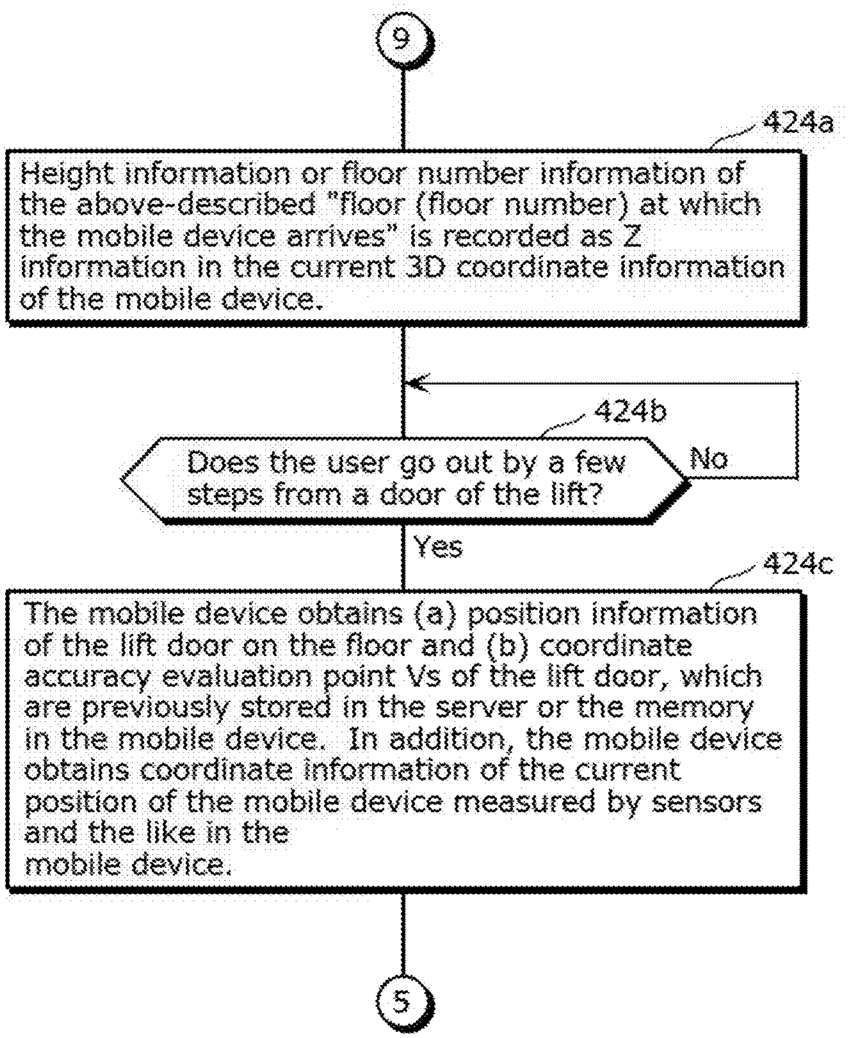

FIG. 281 is a flowchart of processing of determining a position of the mobile device in the building, according to Embodiment 23 of the present invention.

Figure 282:
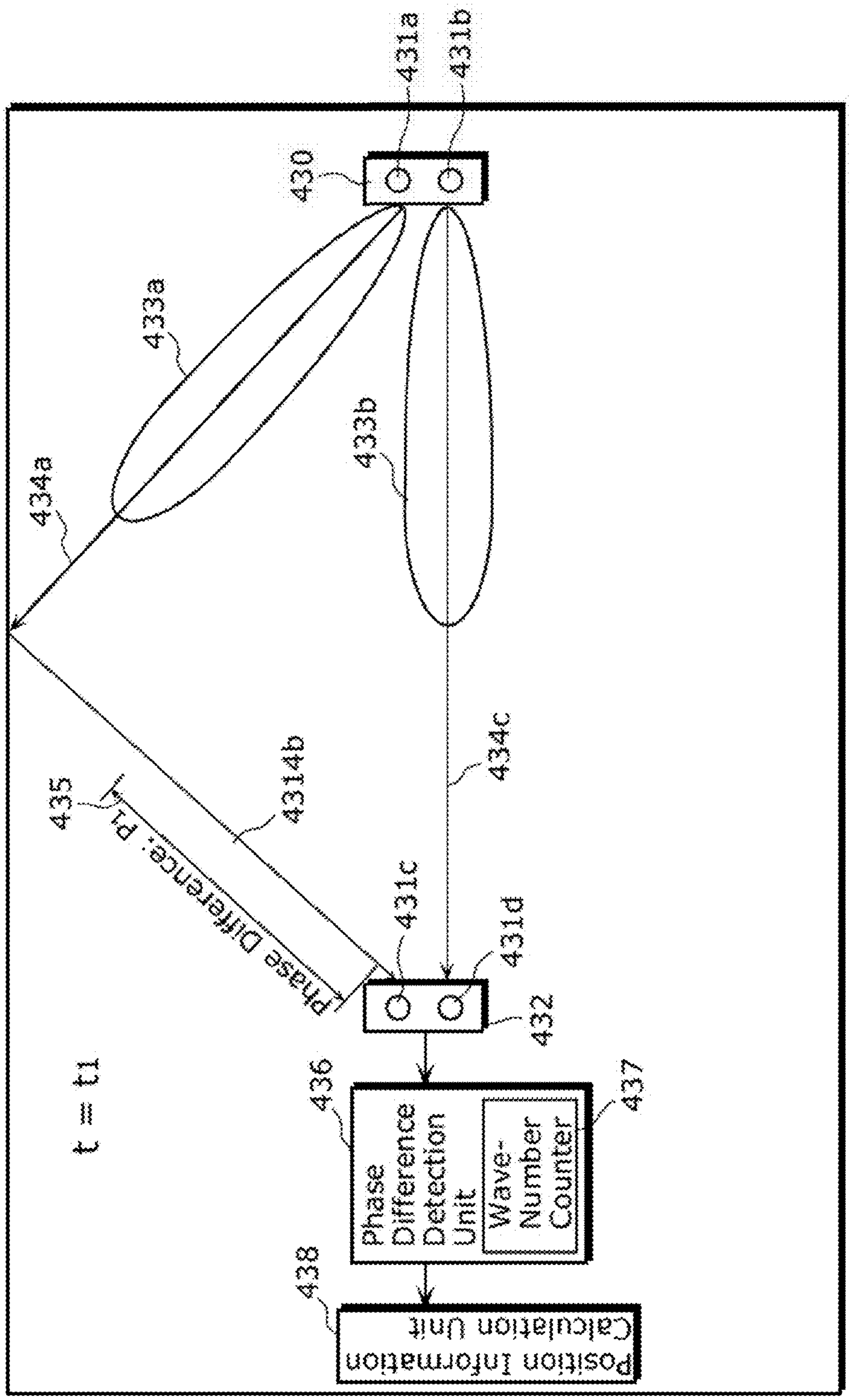

FIG. 282 is a diagram showing the principle of position determination, according to Embodiment 23 of the present invention.

Figure 283:
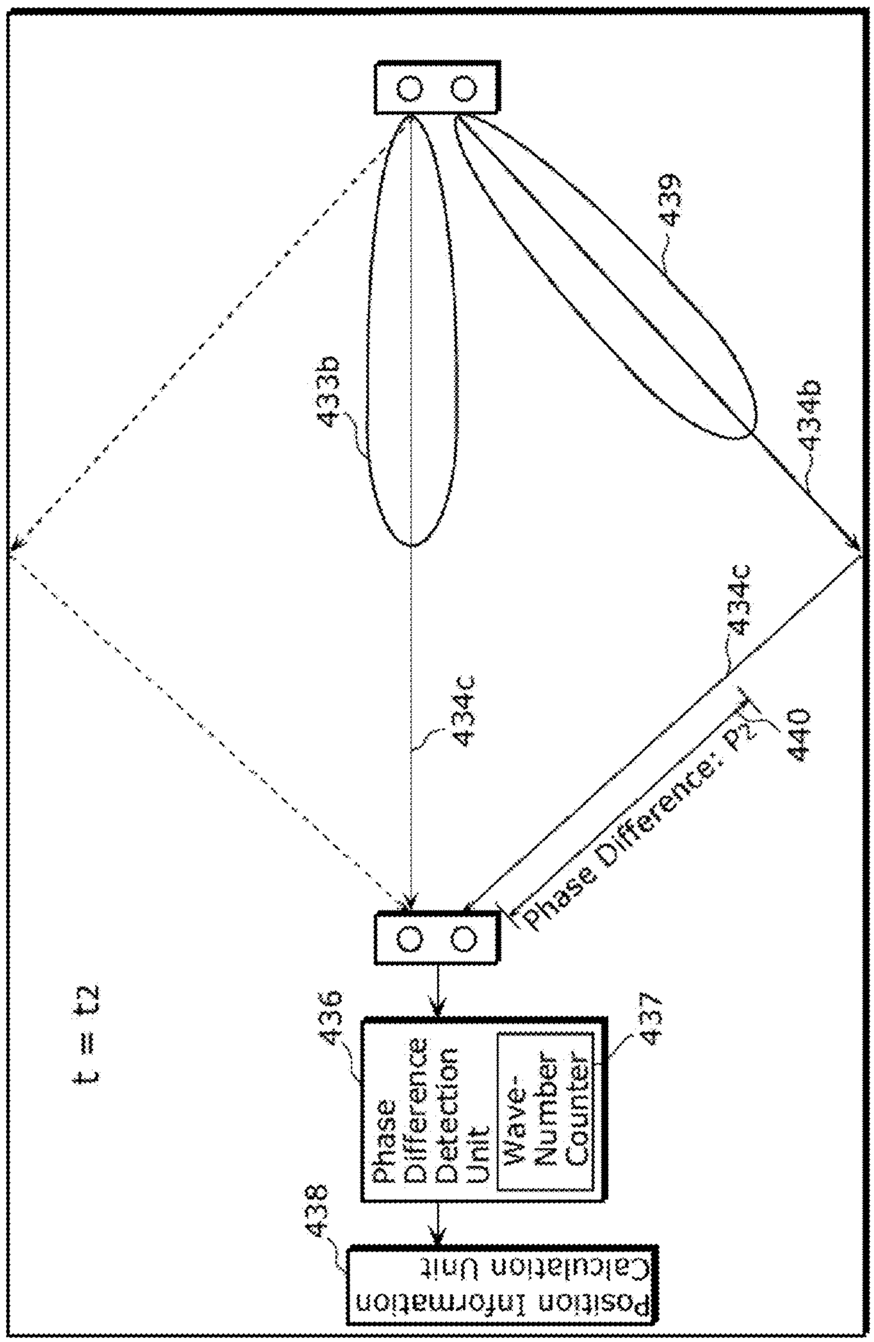

FIG. 283 is a diagram showing the principle of position determination, according to Embodiment 23 of the present invention.

Figure 284:
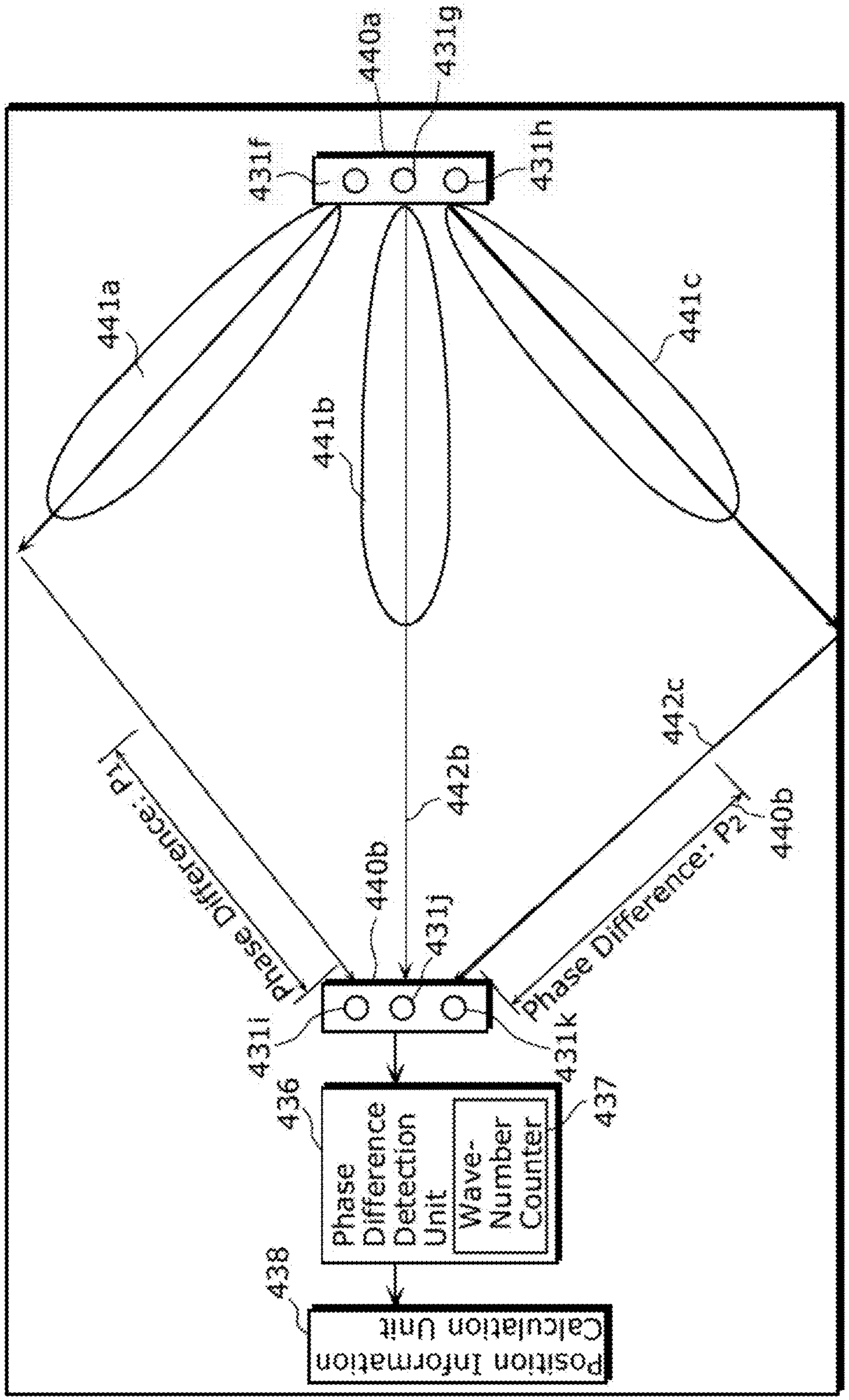

FIG. 284 is a diagram showing the principle of position determination, according to Embodiment 23 of the present invention.

Figure 285:
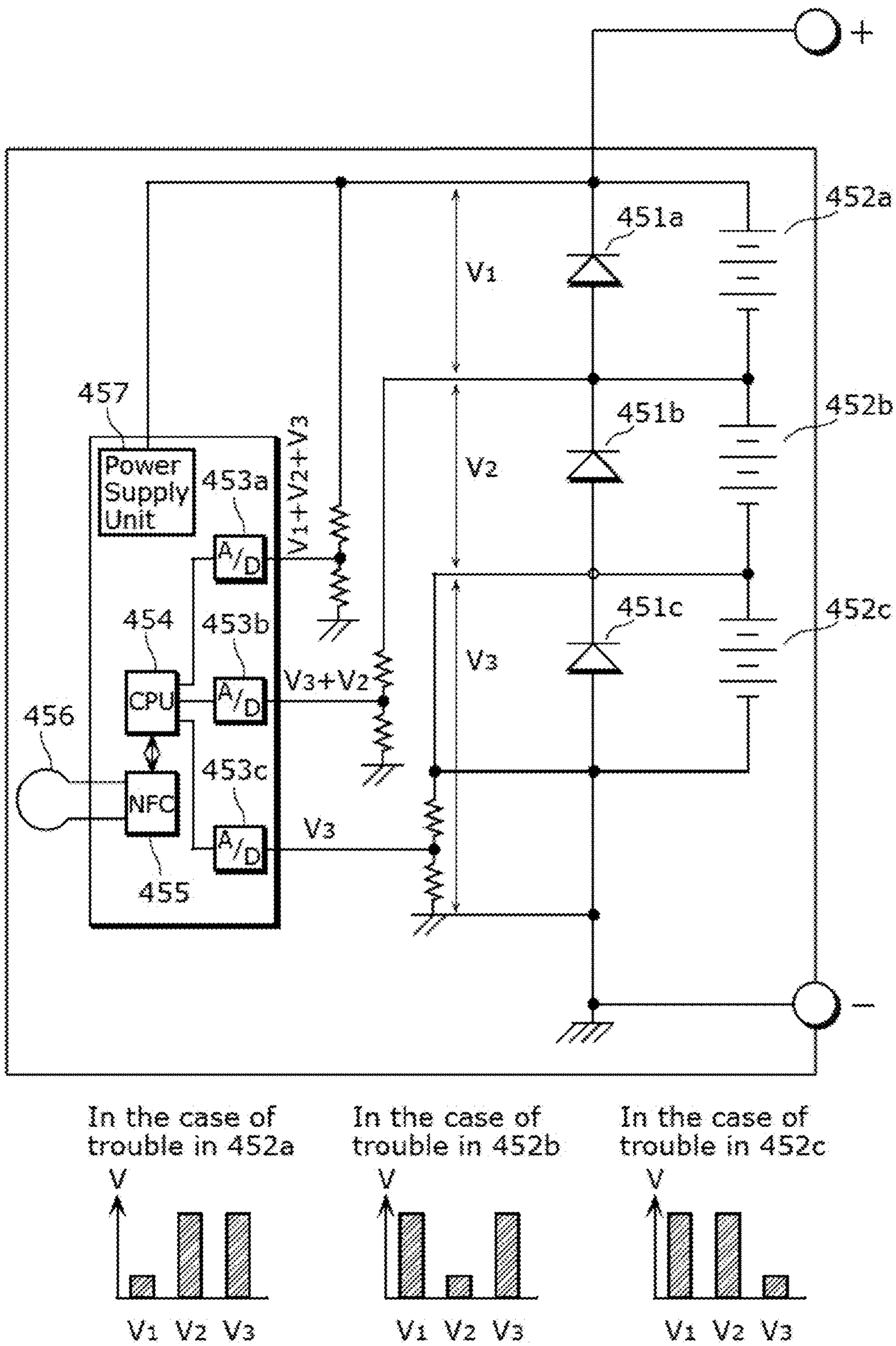

FIG. 285 is a circuit diagram of a solar cell according to Embodiment 23 of the present invention.

Figure 286:
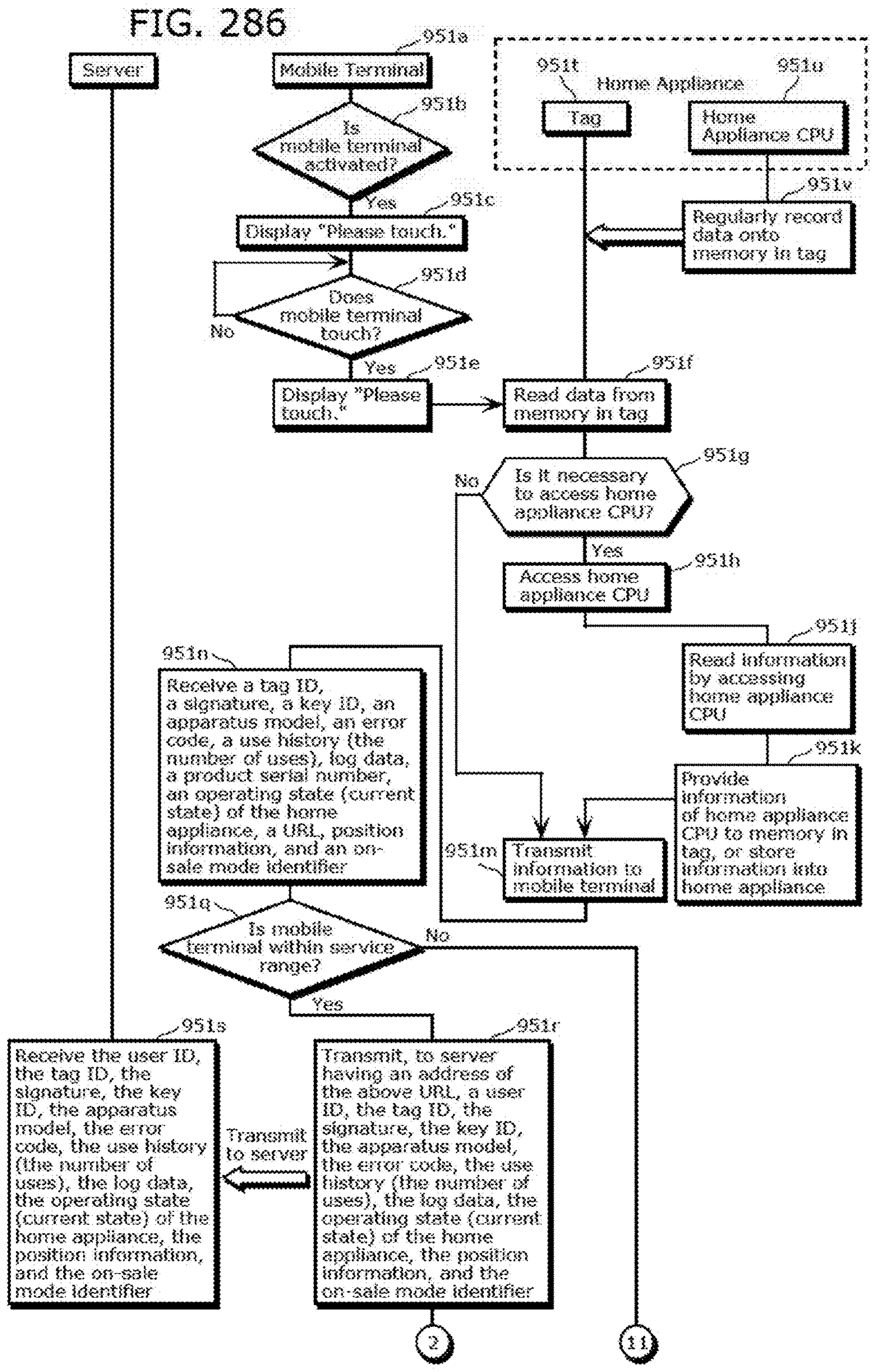

FIG. 286 is a flowchart according to Embodiment 24 of the present invention.

Figure 287:
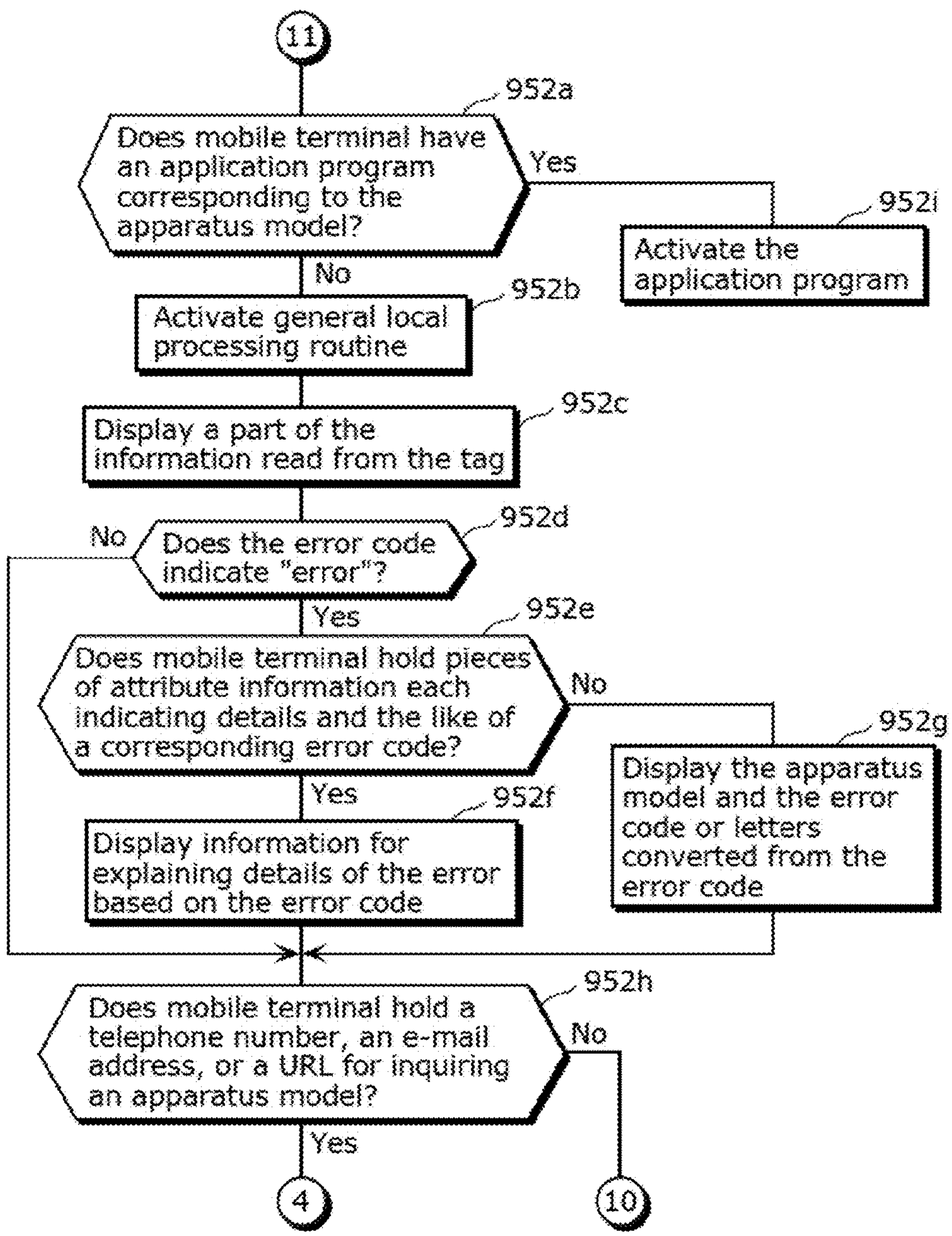

FIG. 287 is a flowchart according to Embodiment 24 of the present invention.

Figure 288:
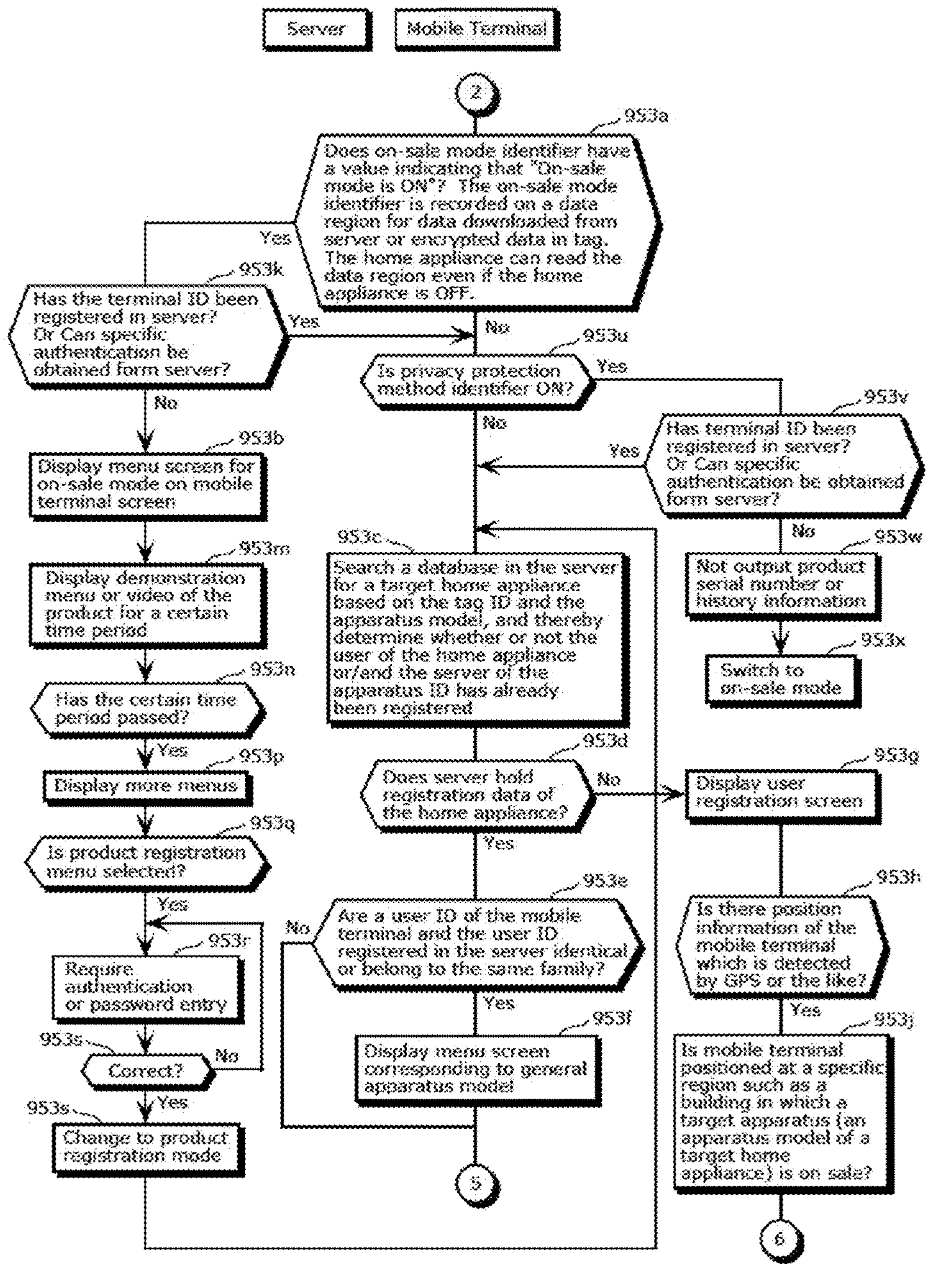

FIG. 288 is a flowchart according to Embodiment 24 of the present invention.

Figure 289:
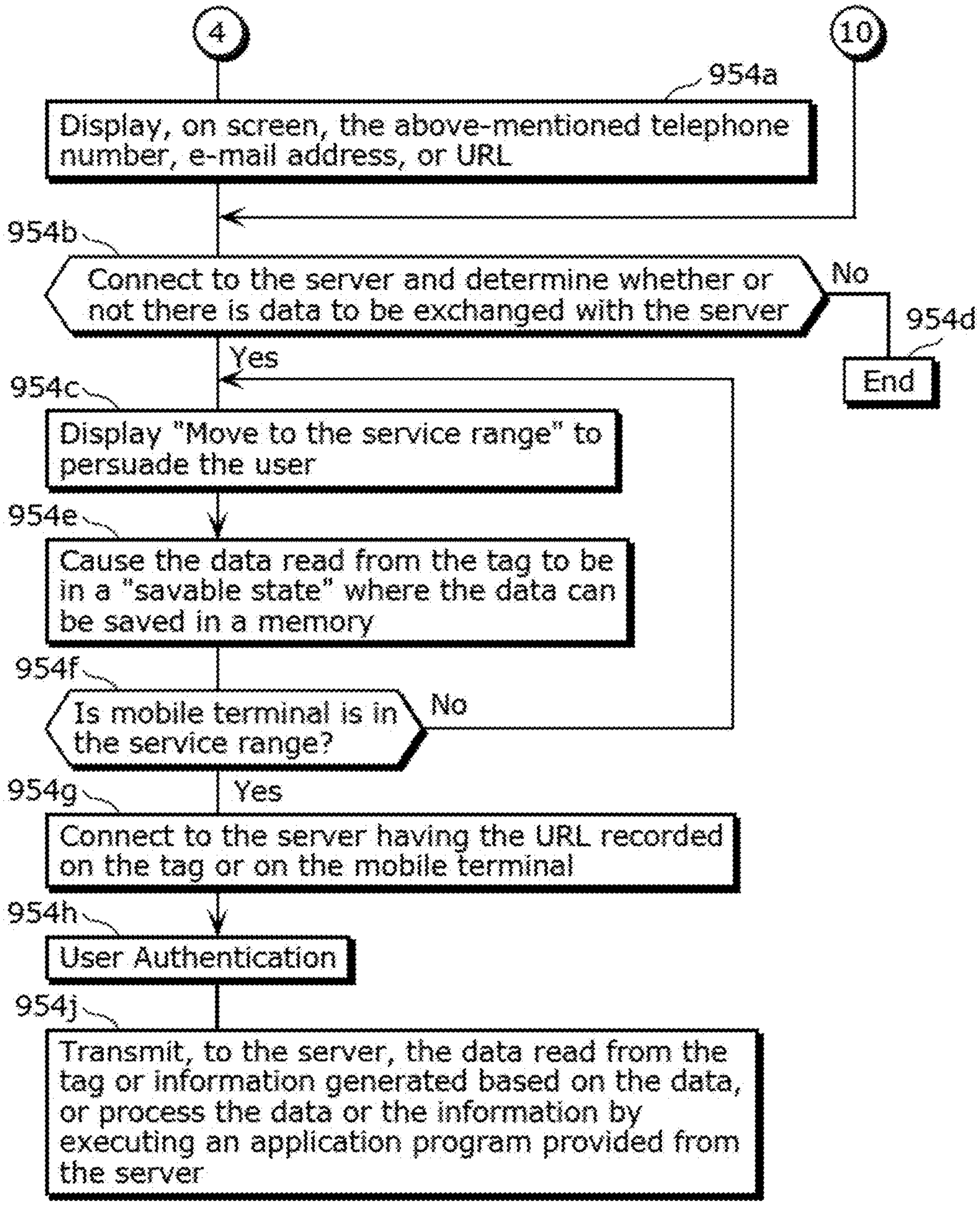

FIG. 289 is a flowchart according to Embodiment 24 of the present invention.

Figure 290:
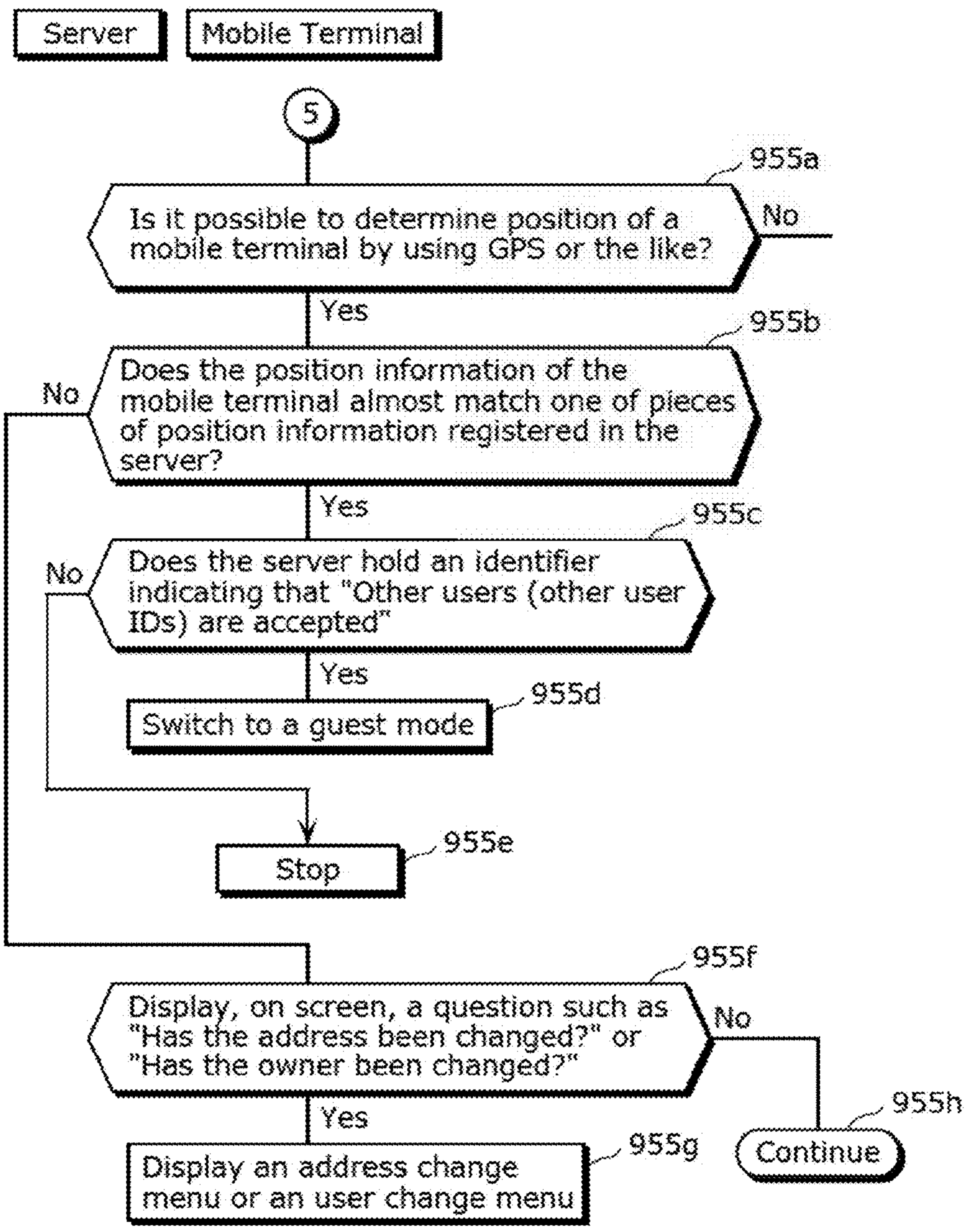

FIG. 290 is a flowchart according to Embodiment 24 of the present invention.

Figure 291:
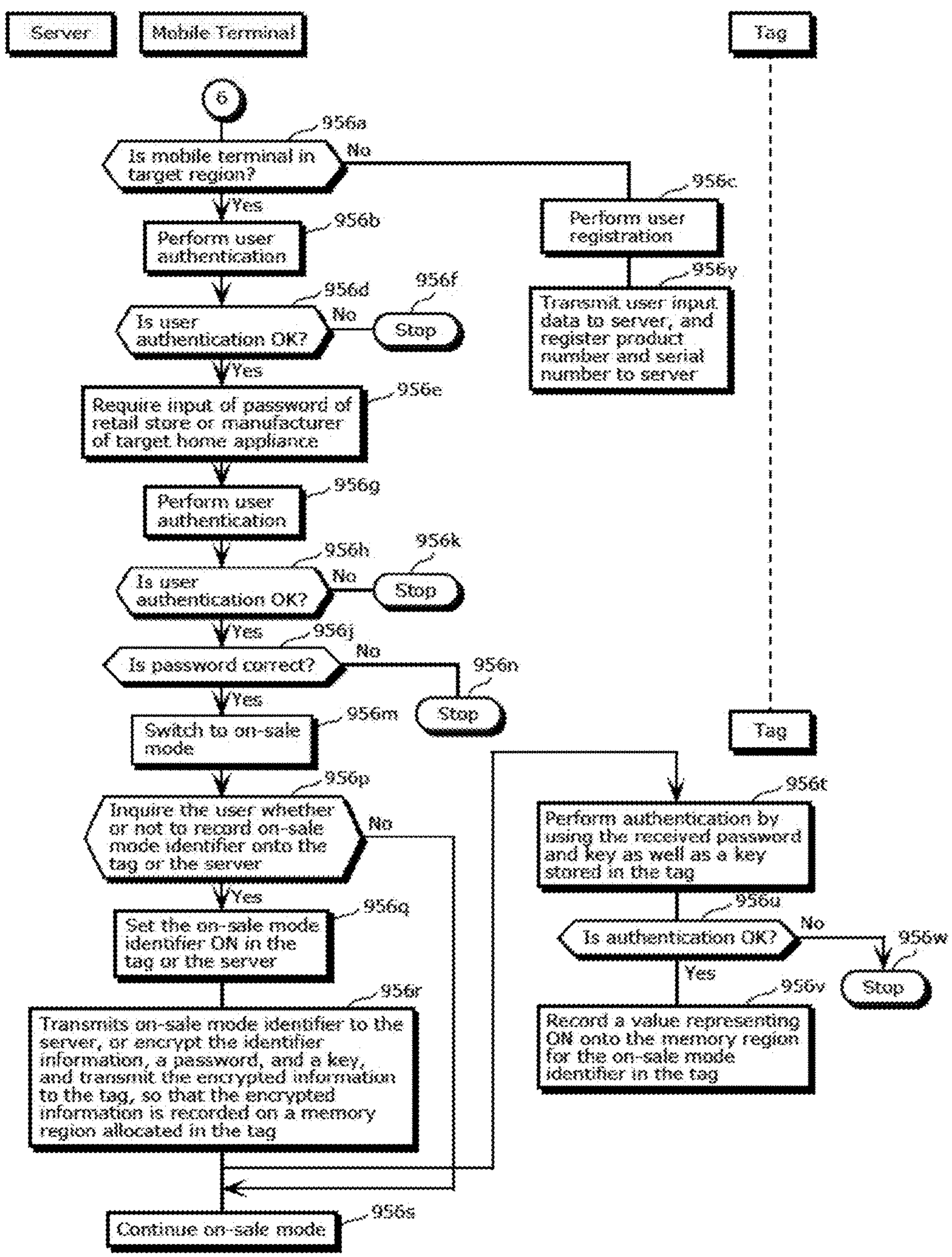

FIG. 291 is a flowchart according to Embodiment 24 of the present invention.

FIG. 292 is a table indicating information recorded on a tag, according to Embodiment 24 of the present invention.

Figure 293:
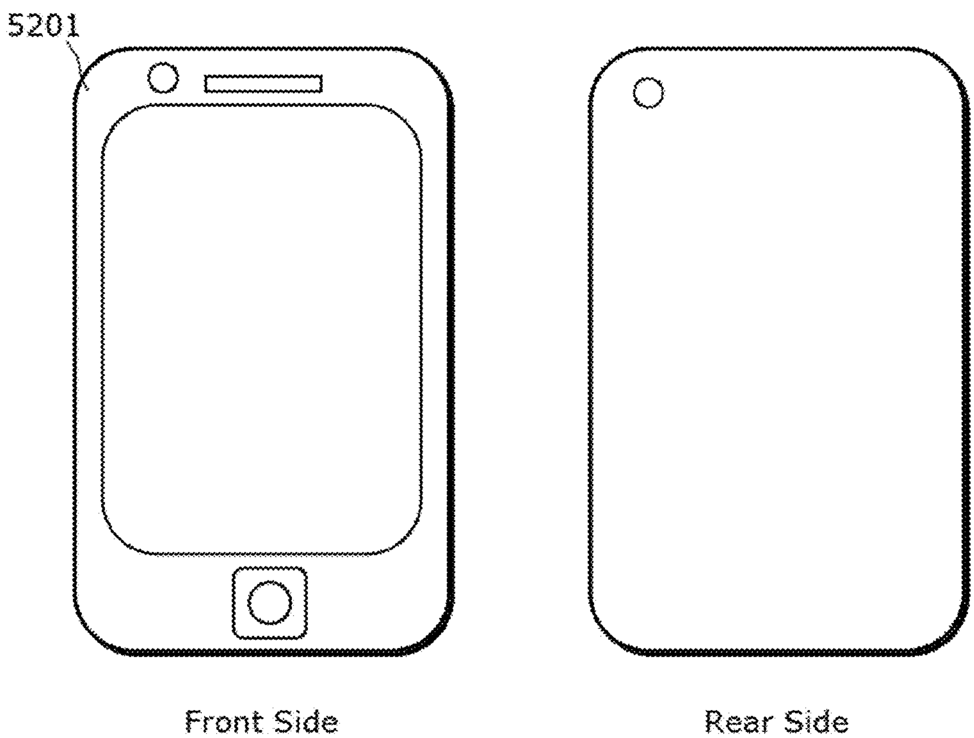

FIG. 293 is a diagram of a mobile terminal according to Embodiment 25 of the present invention.

Figure 294:
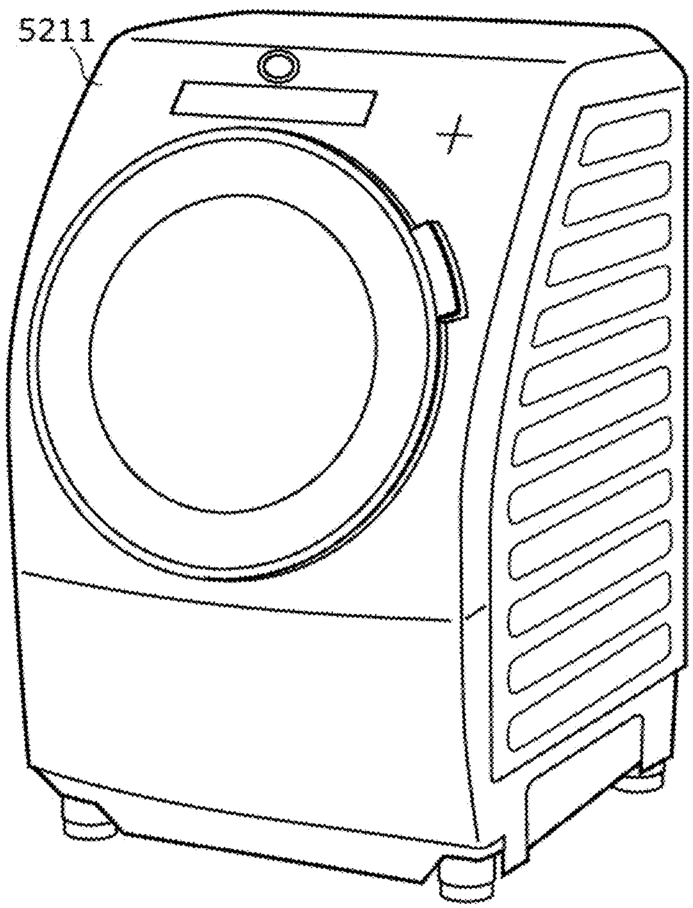

FIG. 294 is a diagram of a home appliance according to Embodiment 25 of the present invention.

Figure 295:
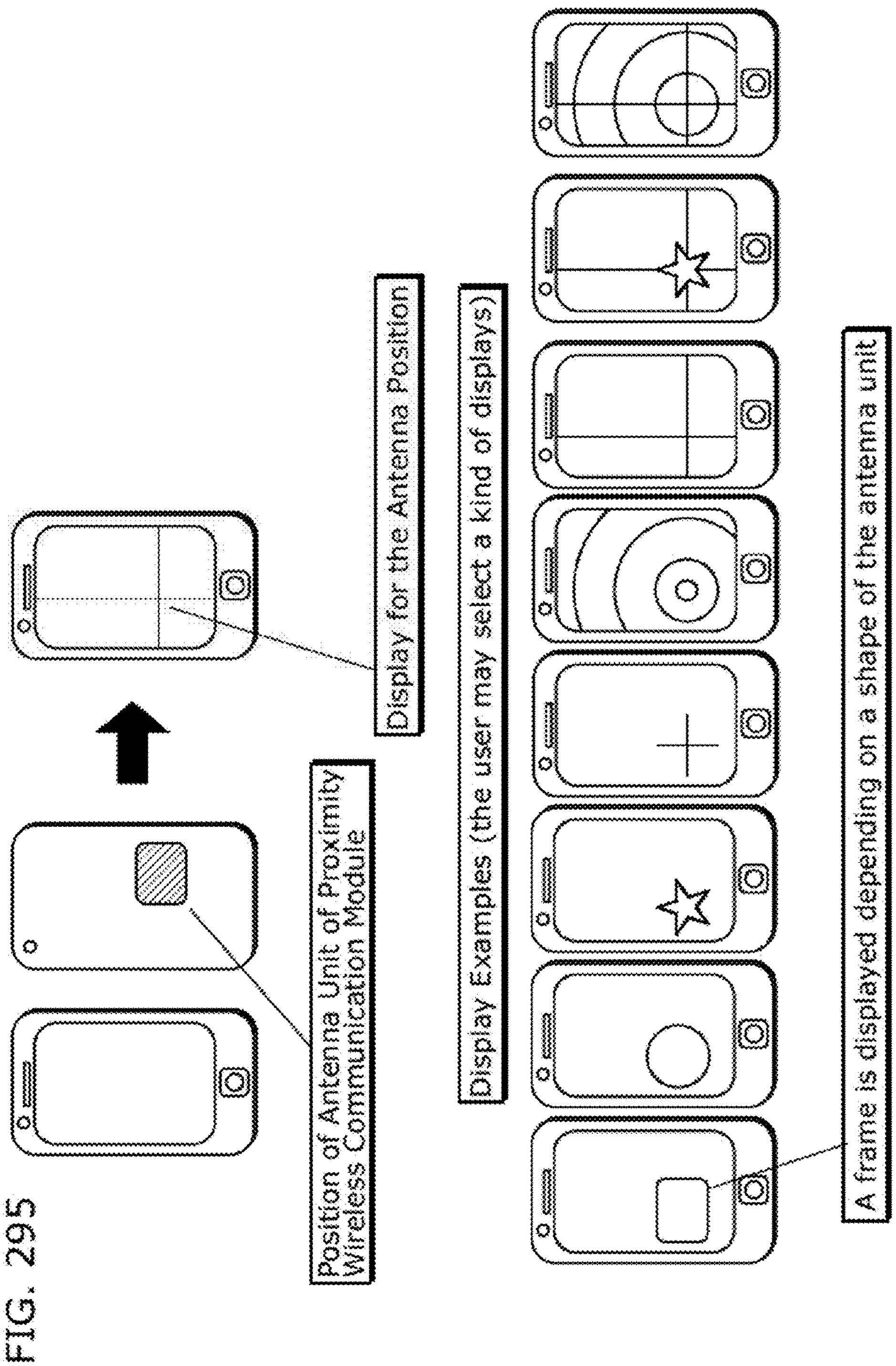

FIG. 295 is a diagram of display states of a module position of the mobile terminal according to Embodiment 25 of the present invention.

Figure 296:
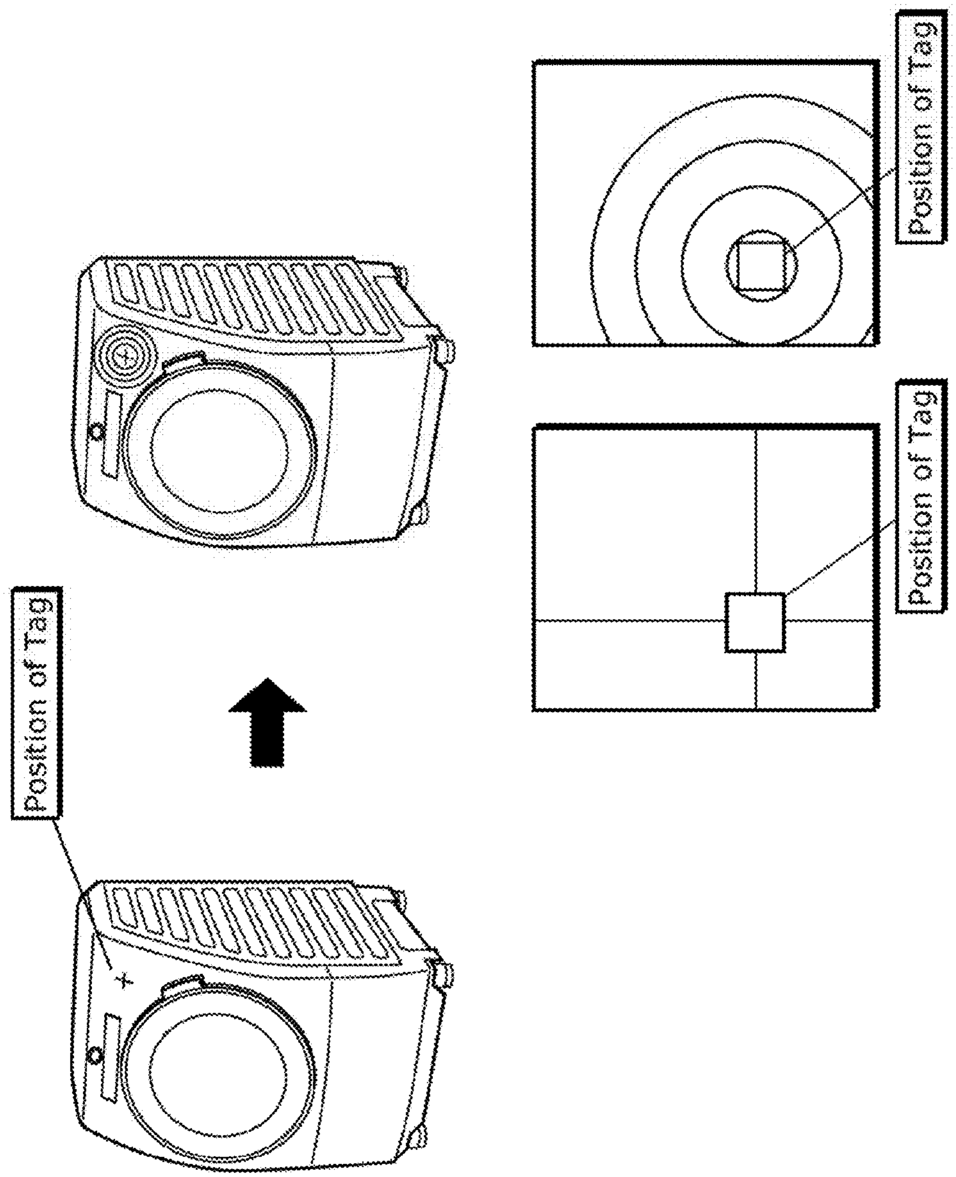

FIG. 296 is a diagram of display states of a module position of the mobile terminal according to Embodiment 25 of the present invention.

Figure 297:
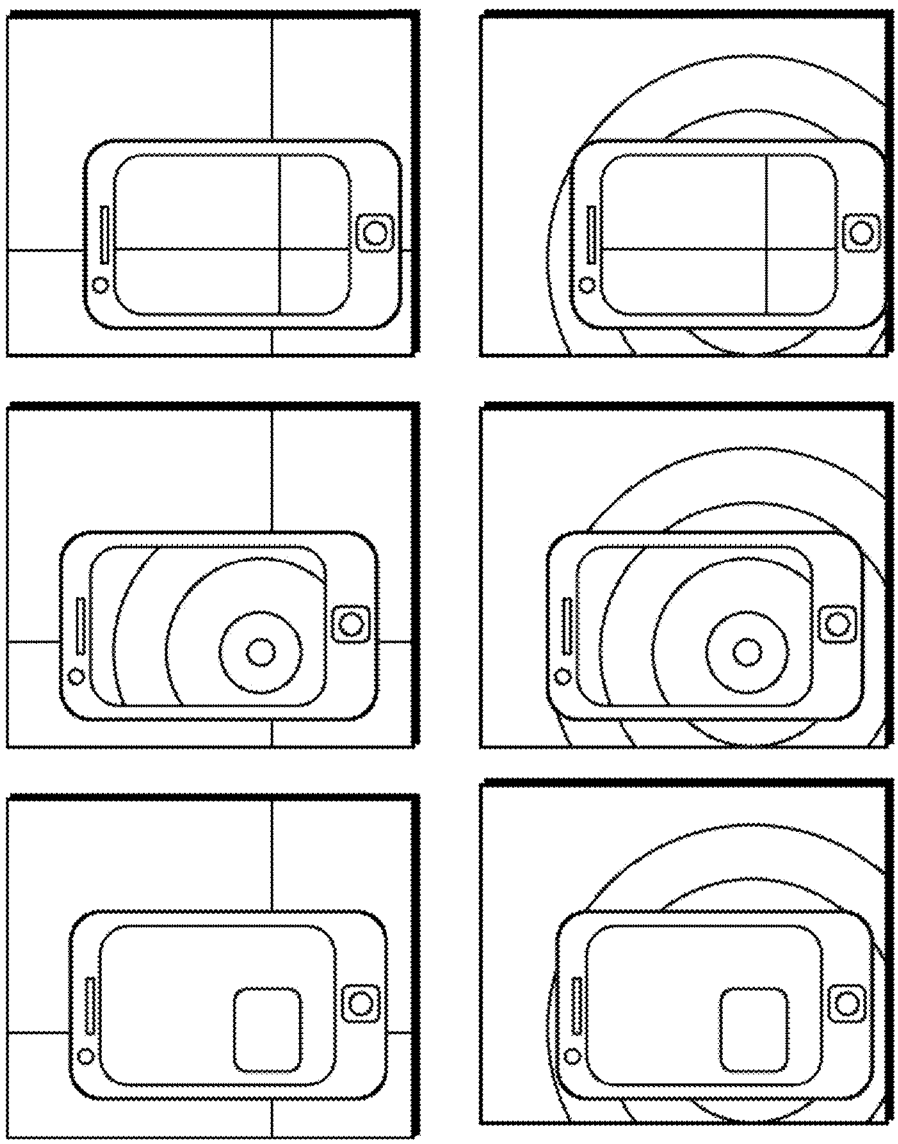

FIG. 297 is a diagram showing proximity wireless communication states of the mobile terminal and the home appliance, according to Embodiment 25 of the present invention.

Figure 298:
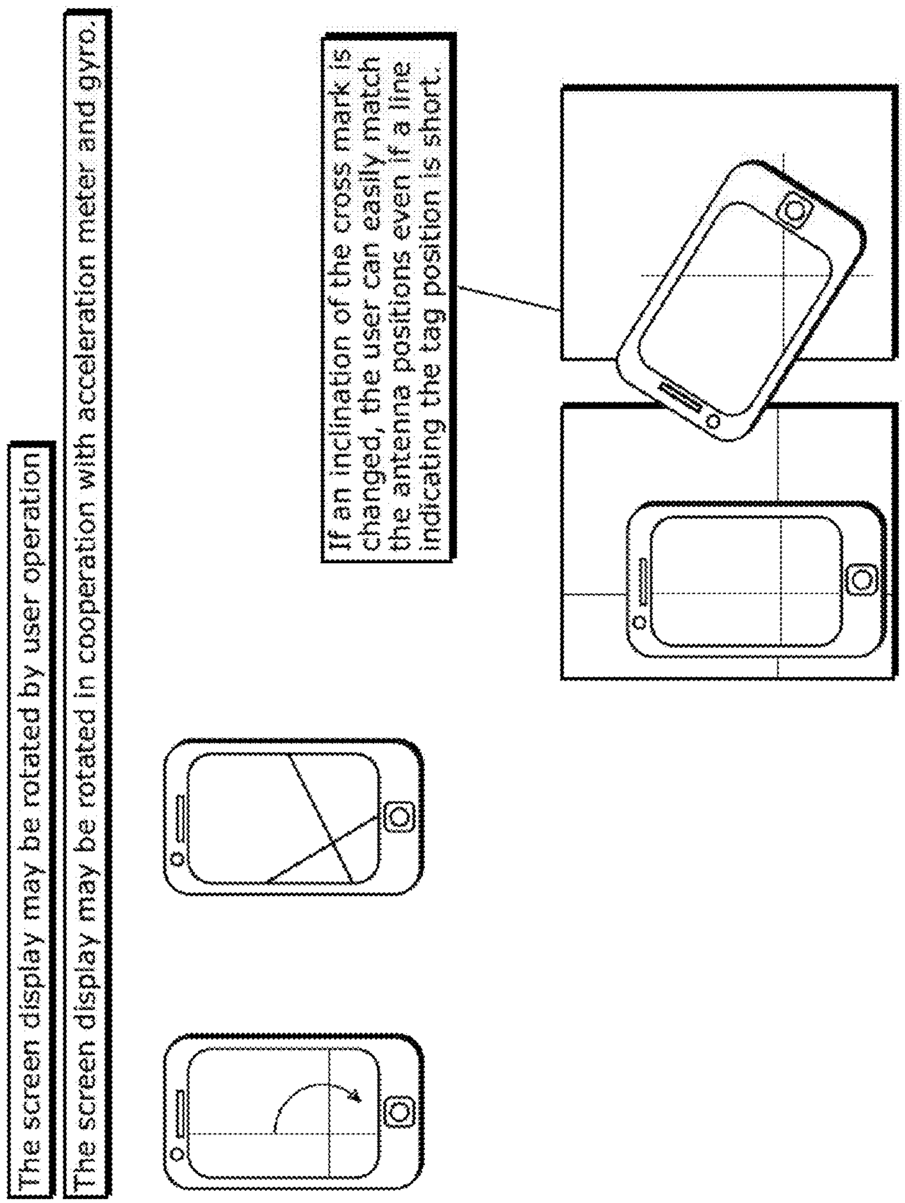

FIG. 298 is a diagram showing the situation where proximity wireless communication mark is cooperated with an acceleration meter and a gyro, according to Embodiment 25 of the present invention.

Figure 299:
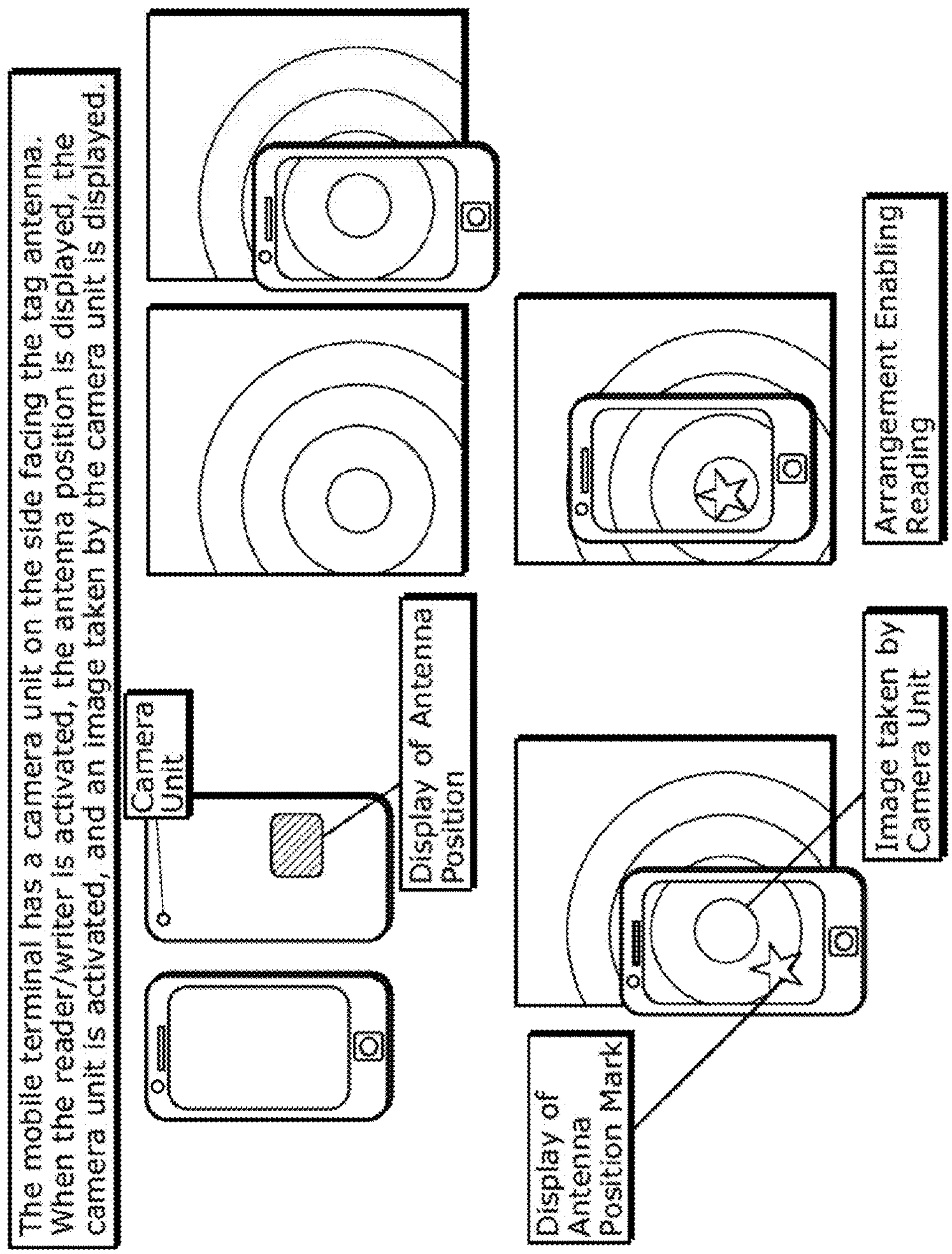

FIG. 299 is a diagram showing the situation where proximity wireless communication mark is cooperated with a camera, according to Embodiment 25 of the present invention.

Figure 300:
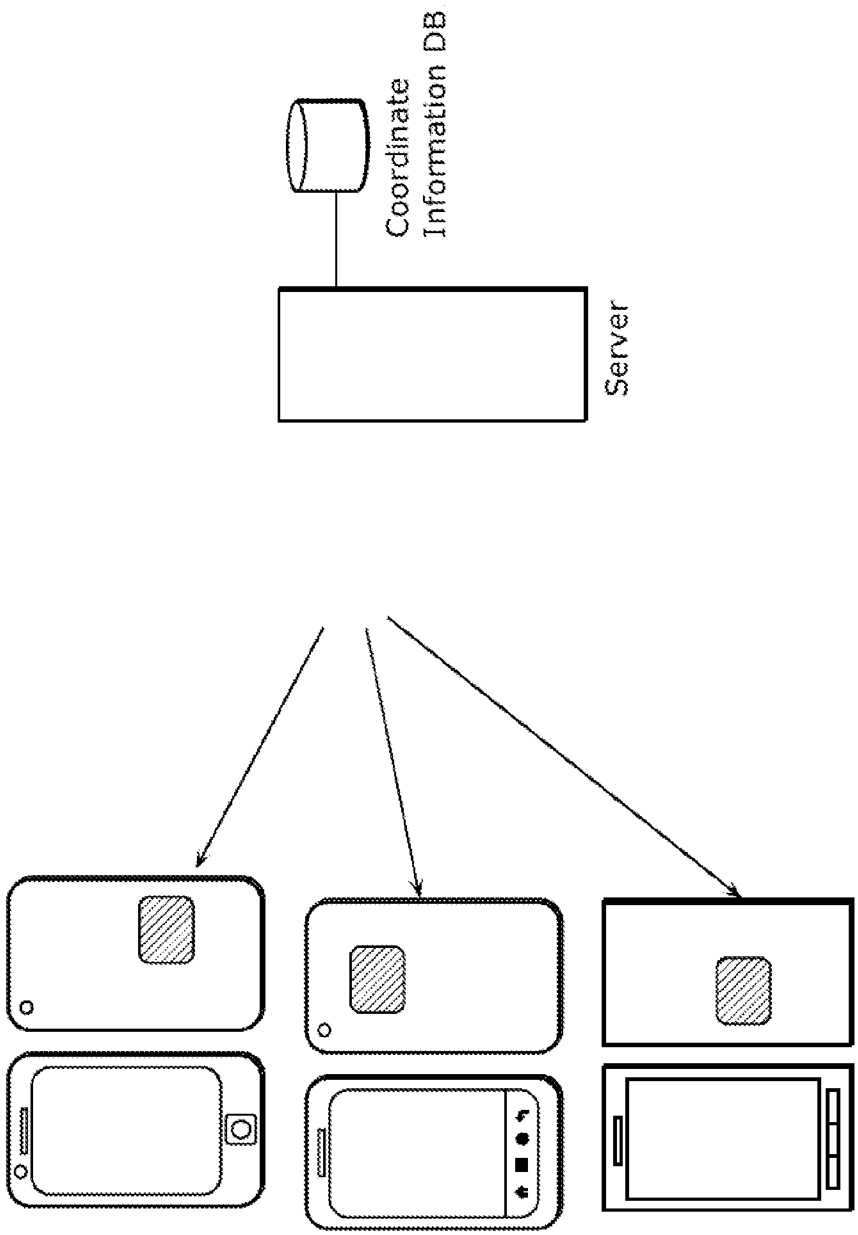

FIG. 300 is a diagram showing the situation where an application program is downloaded from a server, according to Embodiment 25 of the present invention.

Figure 301:
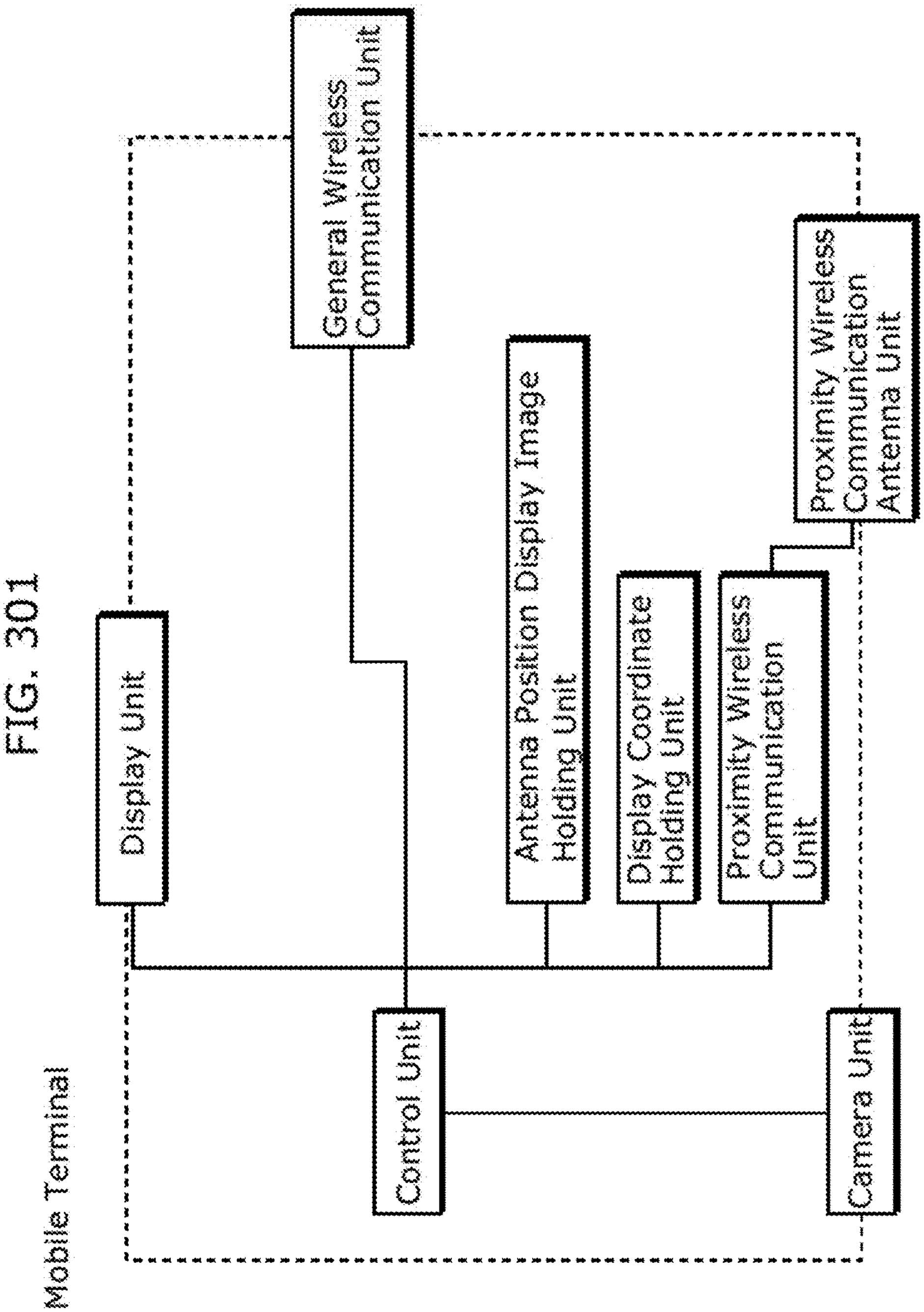

FIG. 301 is a functional block diagram according to Embodiment 25 of the present invention.

Figure 302:
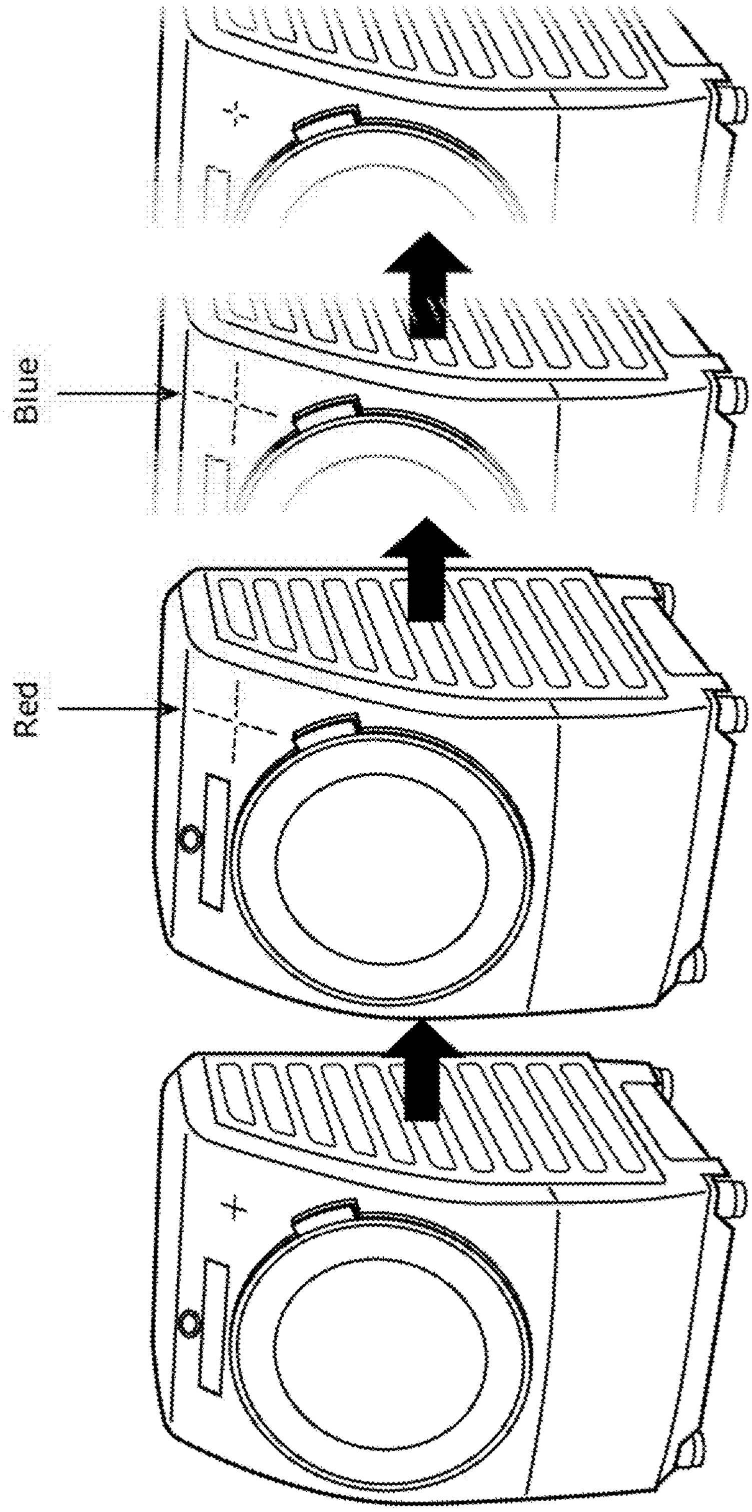

FIG. 302 is a diagram of state changes in the case where a trouble occurs in a home appliance, according to Embodiment 25 of the present invention.

Figure 303:
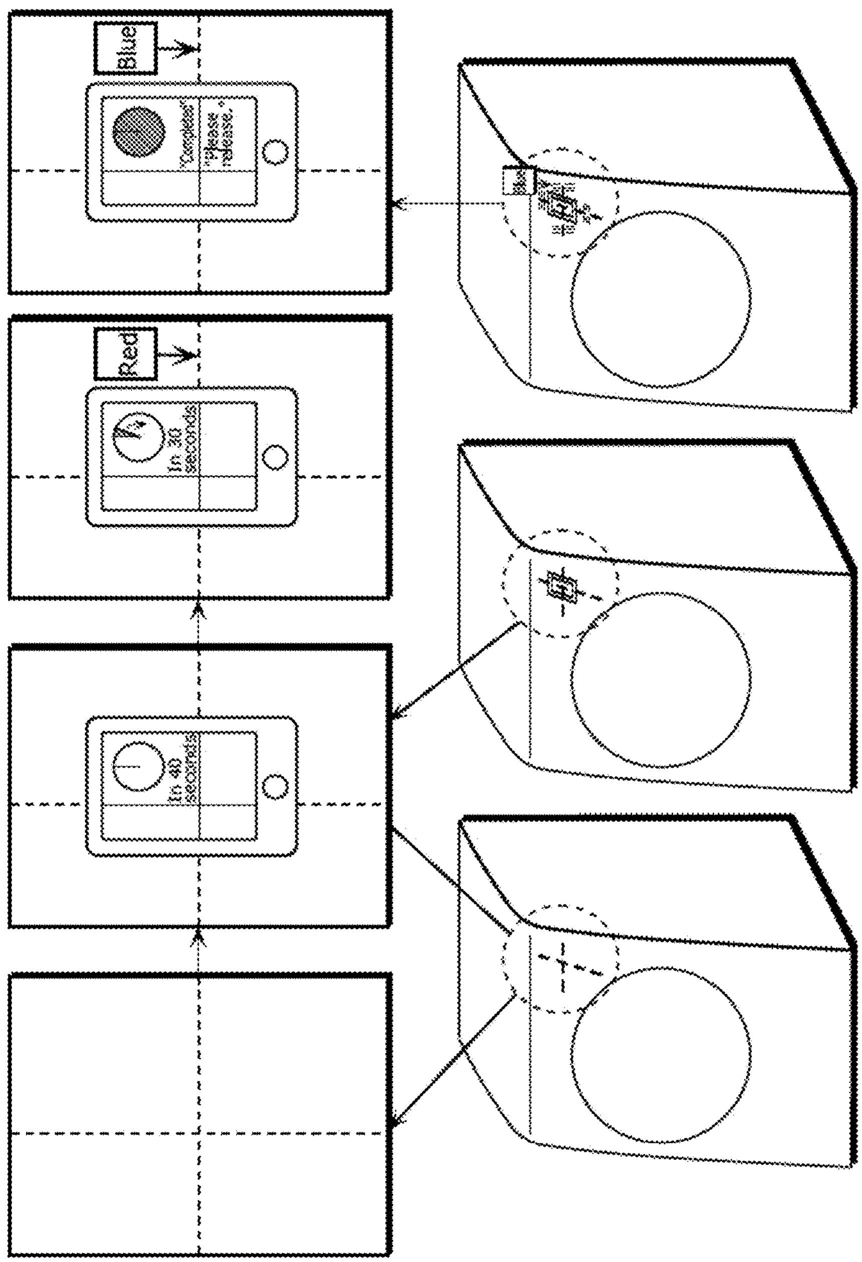

FIG. 303 is a diagram of state changes in the case where the home appliance performs communication for a long time, according to Embodiment 25 of the present invention.

Figure 304:
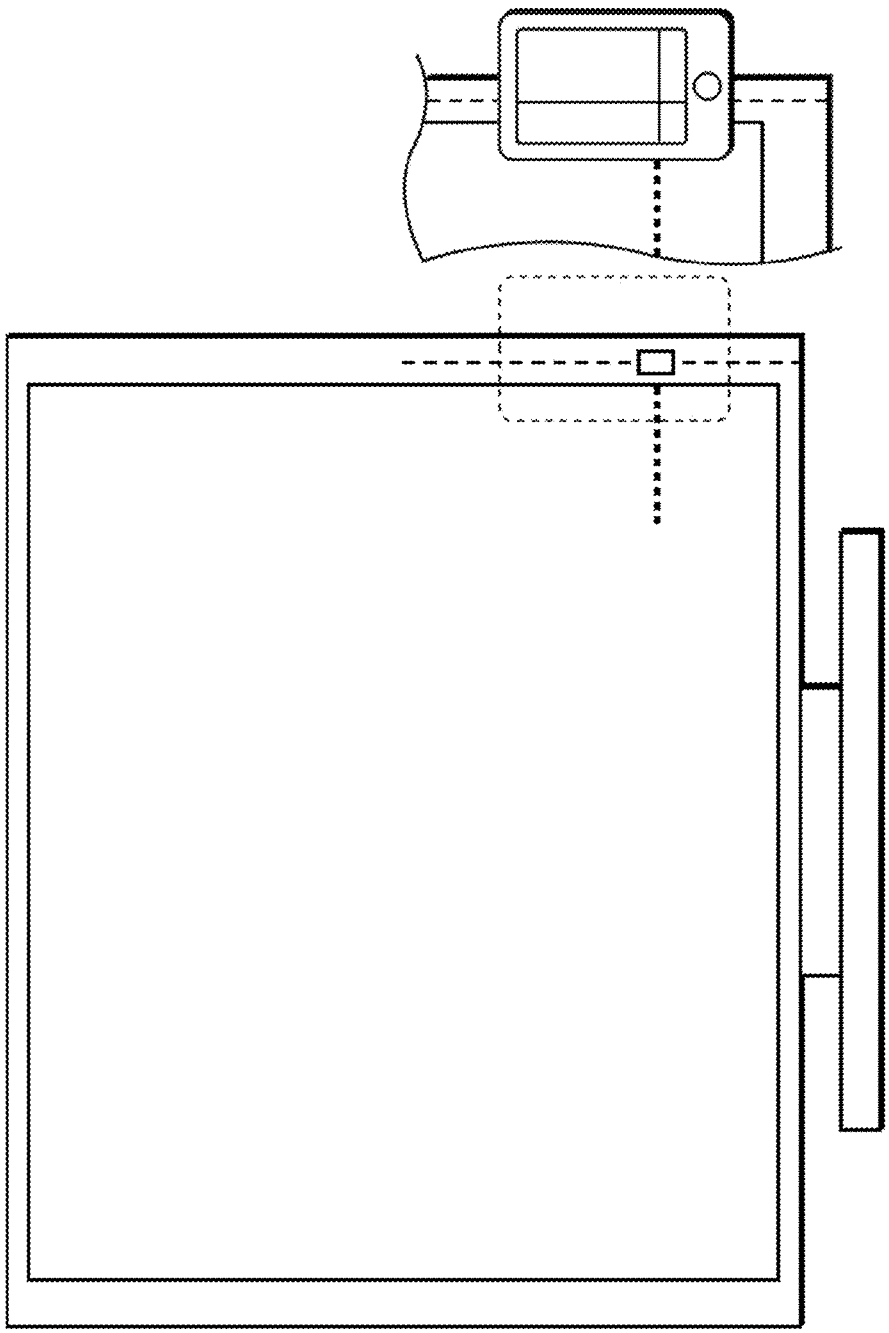

FIG. 304 is a diagram of a home appliance having a display screen according to Embodiment 52 of the present invention.

Figure 305:
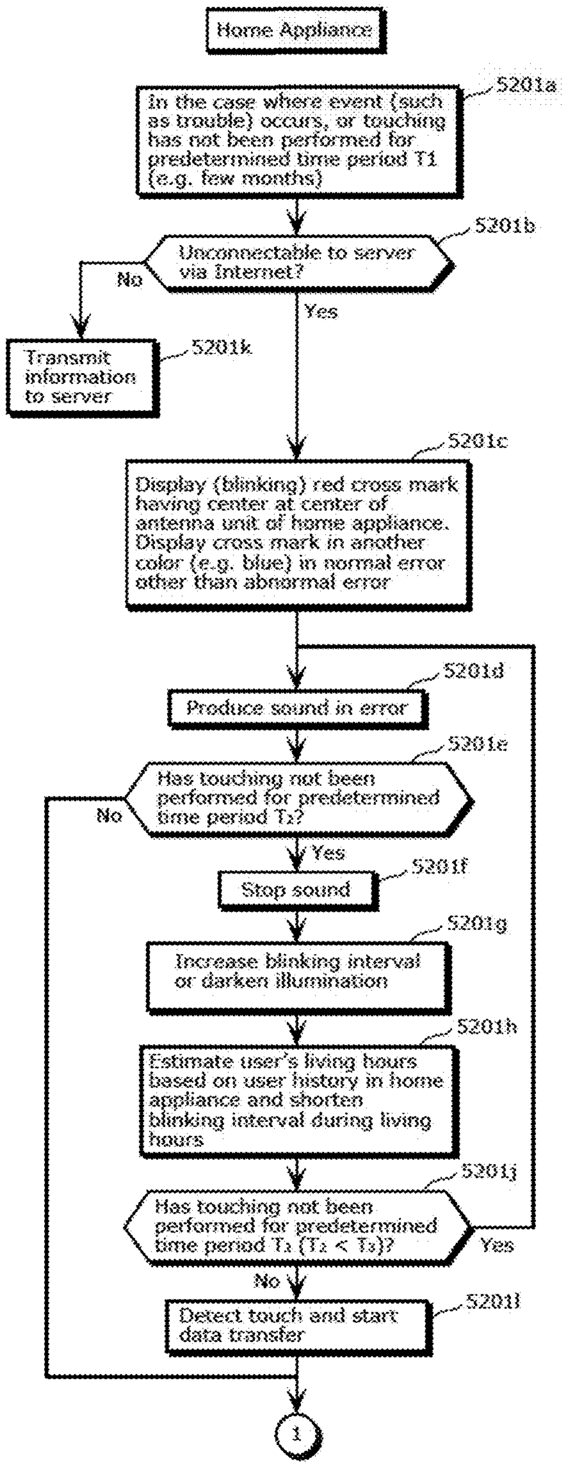

FIG. 305 is flowchart 1 according to Embodiment 25 of the present invention.

Figure 306:
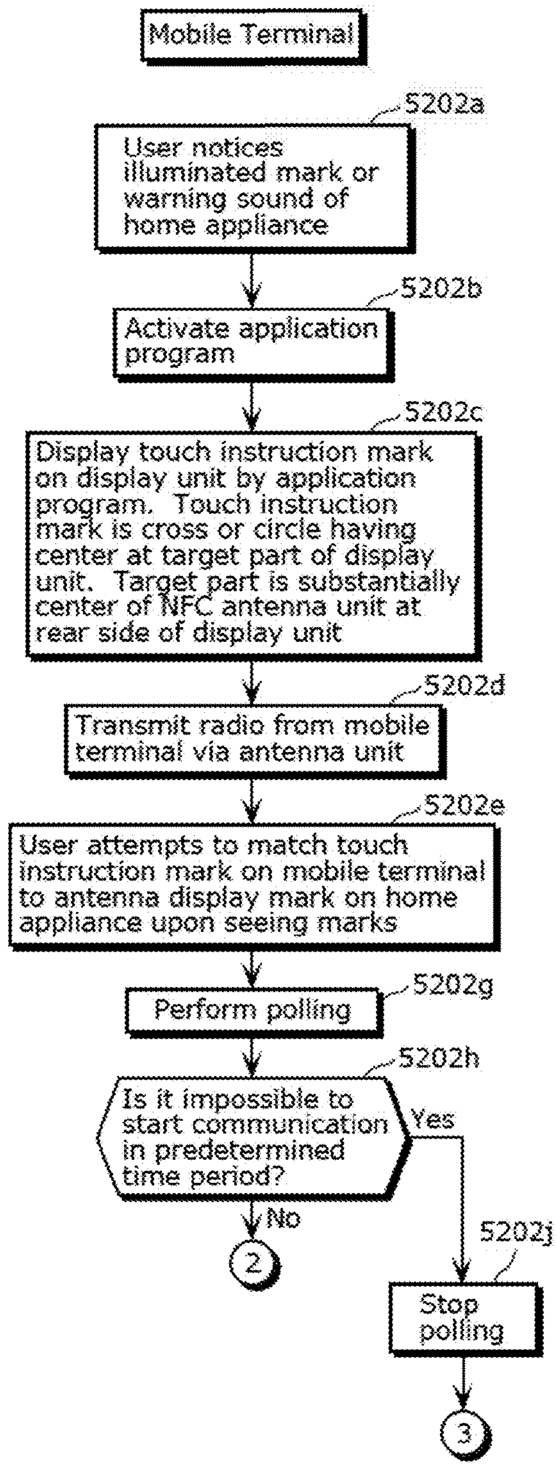

FIG. 306 is flowchart 2 according to Embodiment 25 of the present invention.

Figure 307:
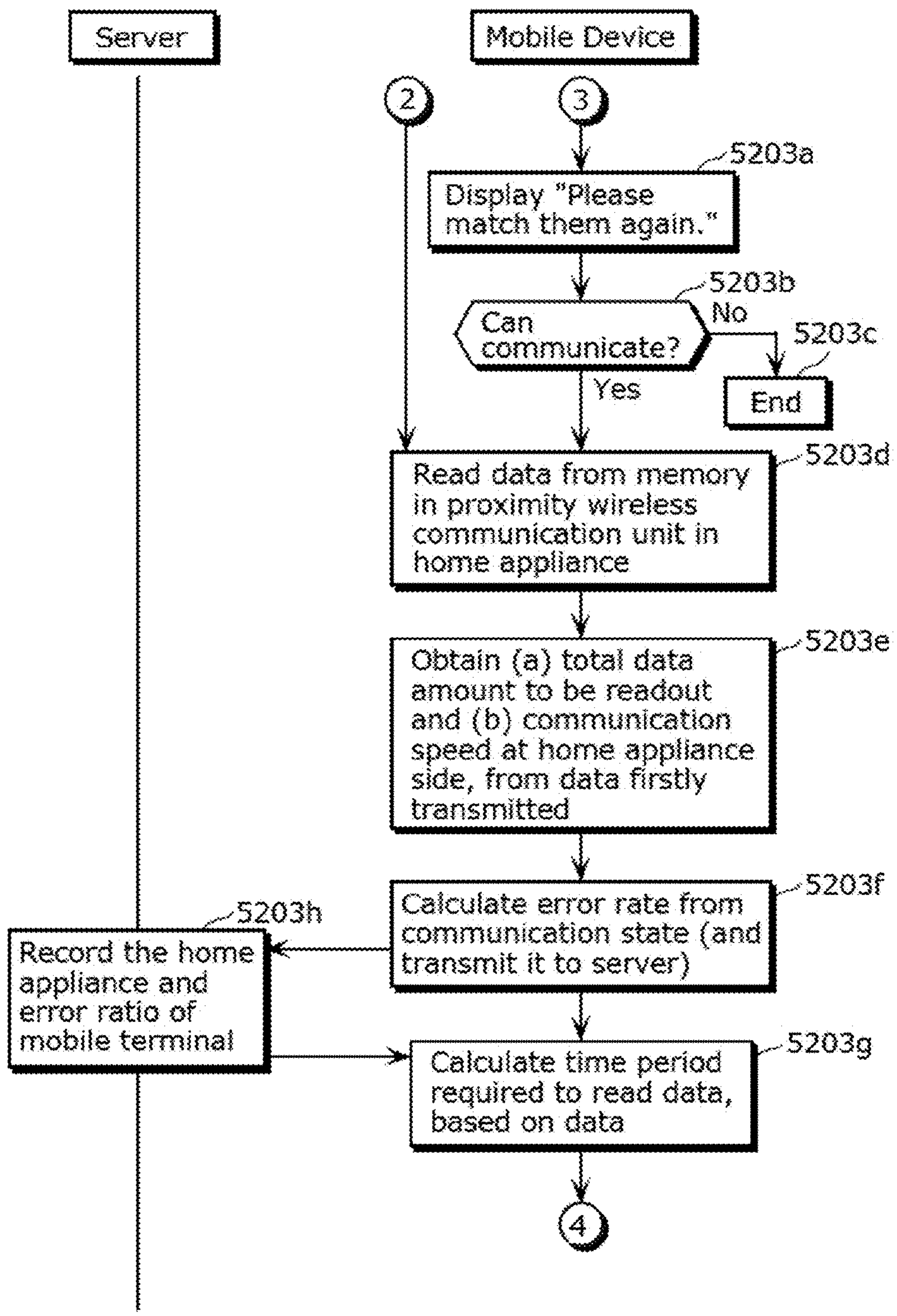

FIG. 307 is flowchart 3 according to Embodiment 25 of the present invention.

Figure 308:
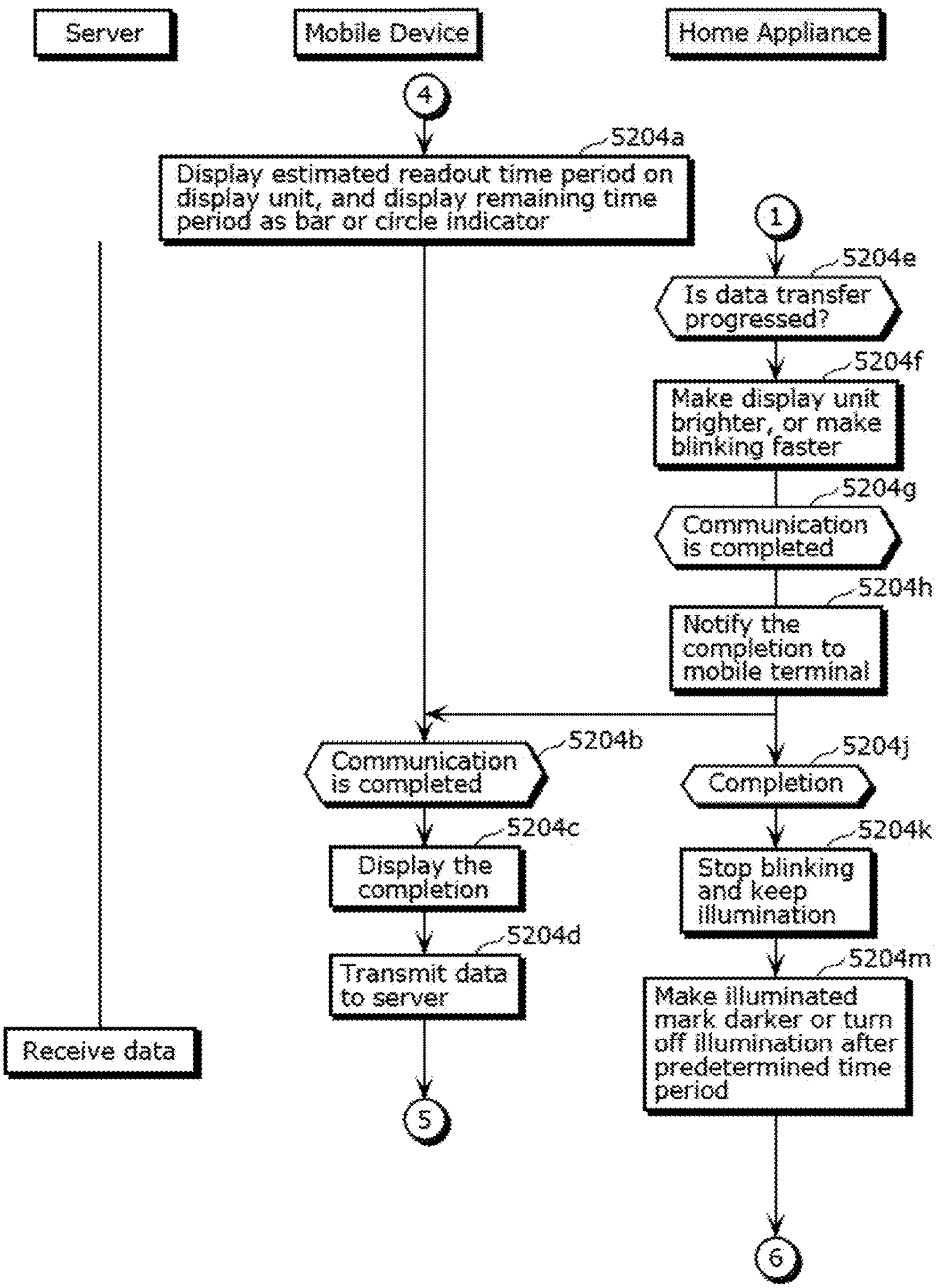

FIG. 308 is flowchart 4 according to Embodiment 25 of the present invention.

Figure 309:
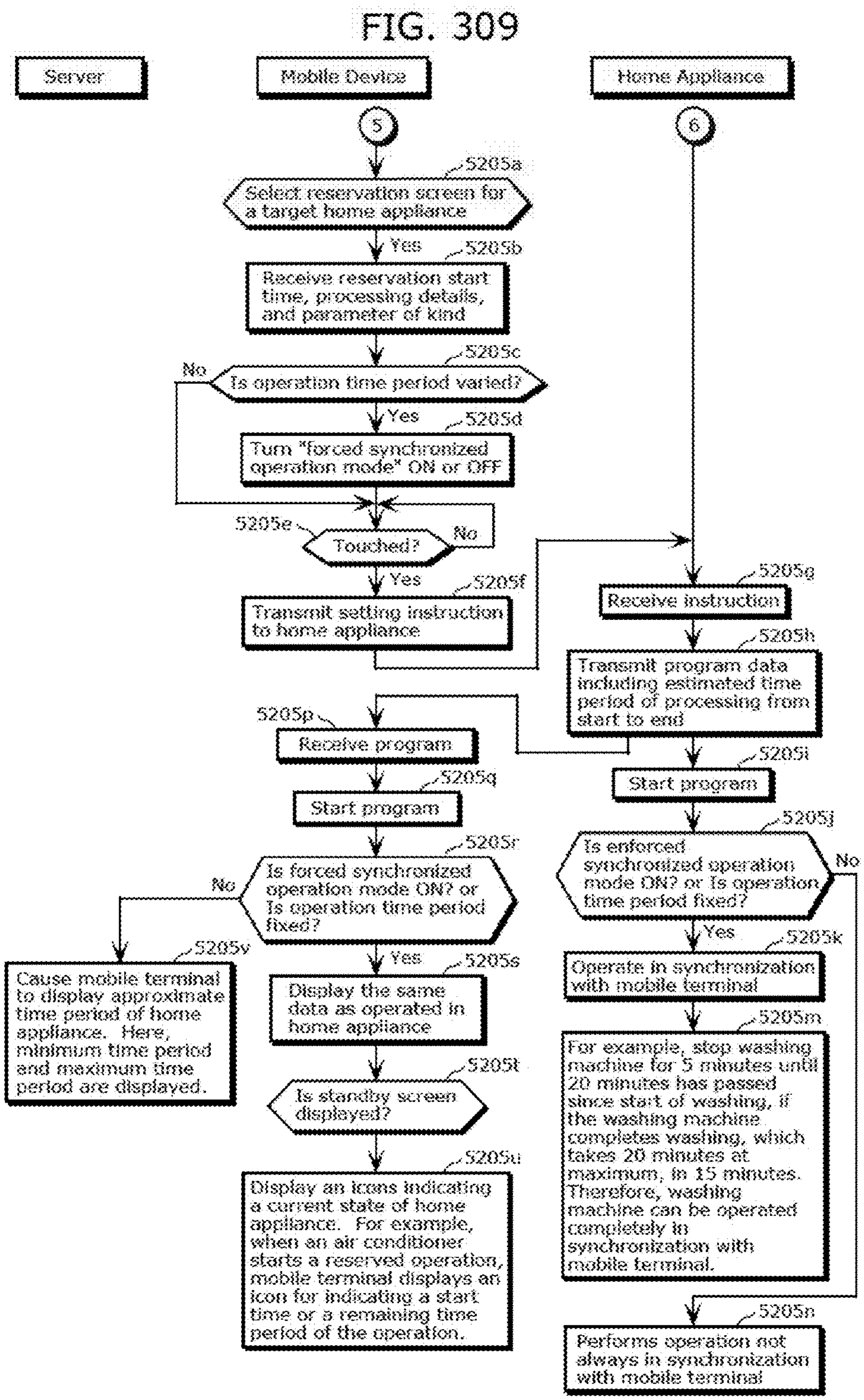

FIG. 309 is flowchart 5 according to Embodiment 25 of the present invention.

Figure 310:
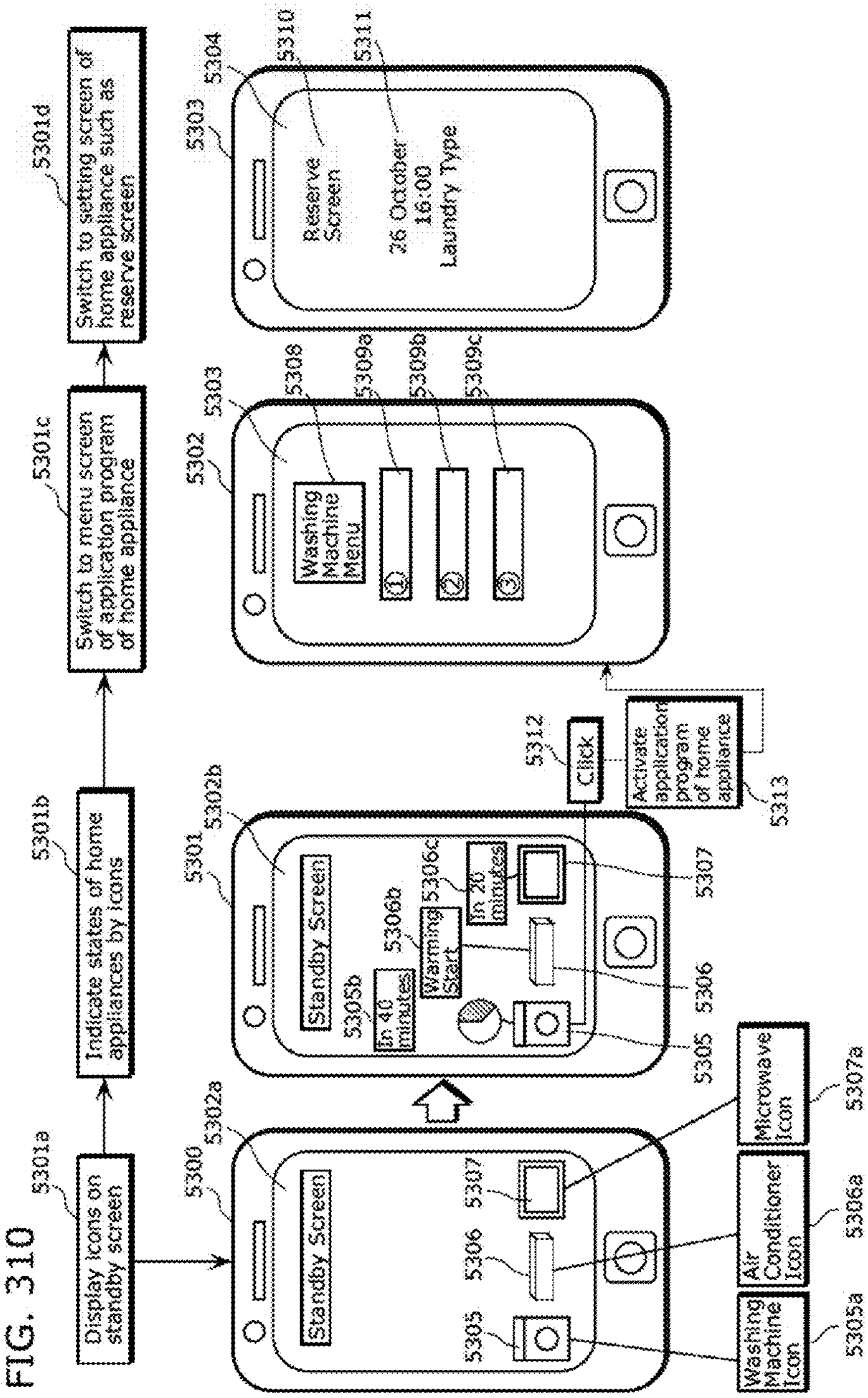

FIG. 310 is a diagram showing a display method of a standby screen of a terminal according to Embodiment 25 of the present invention.

Figure 311:
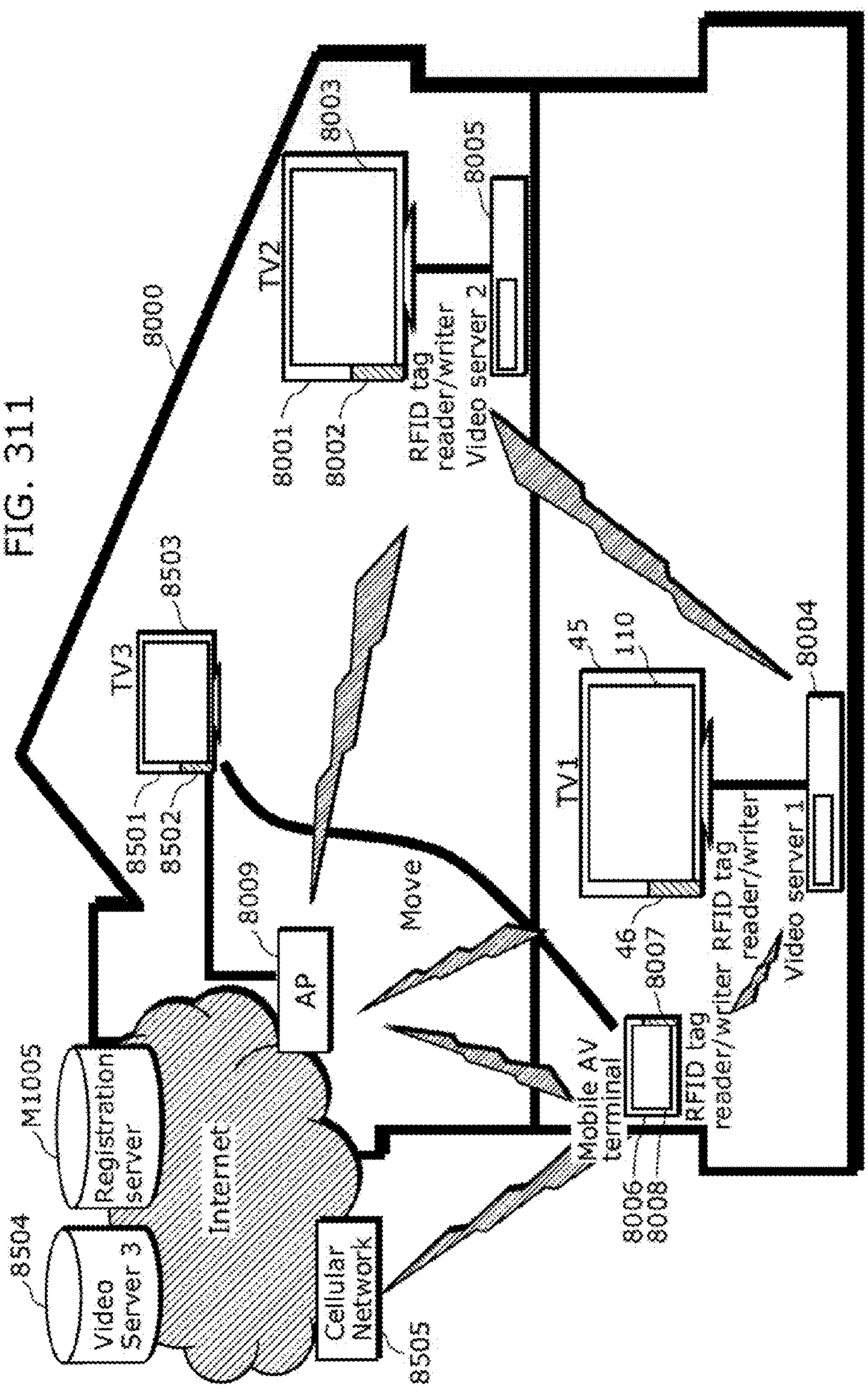

FIG. 311 is a diagram showing an assumed home network environment according to Embodiment 26 of the present invention.

FIG. 312 is a diagram showing an example of terminal information according to Embodiment 26 of the present invention.

Figure 313:
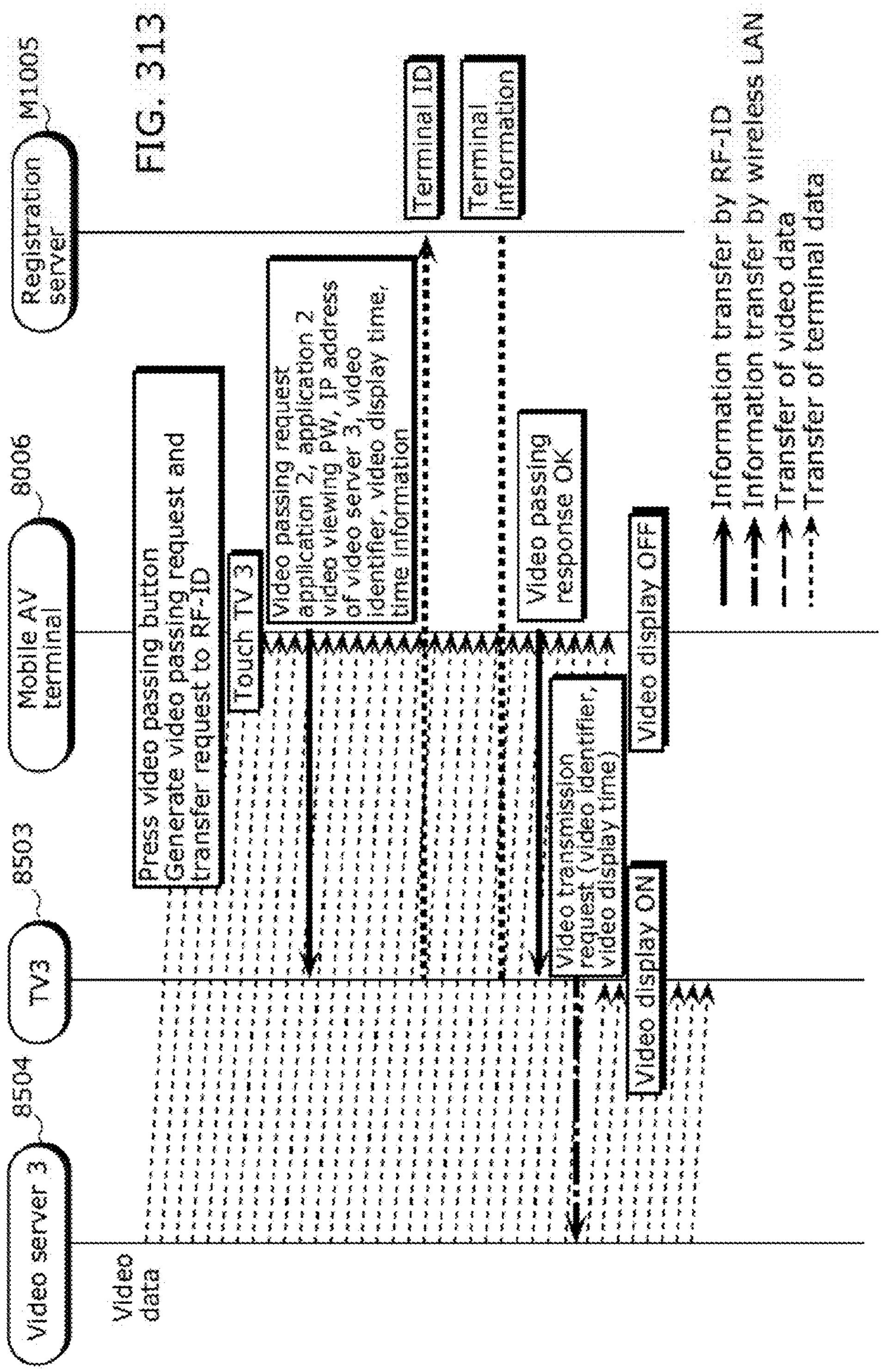

FIG. 313 is a diagram for explaining video passing between terminals according to Embodiment 26 of the present invention.

Figure 314:
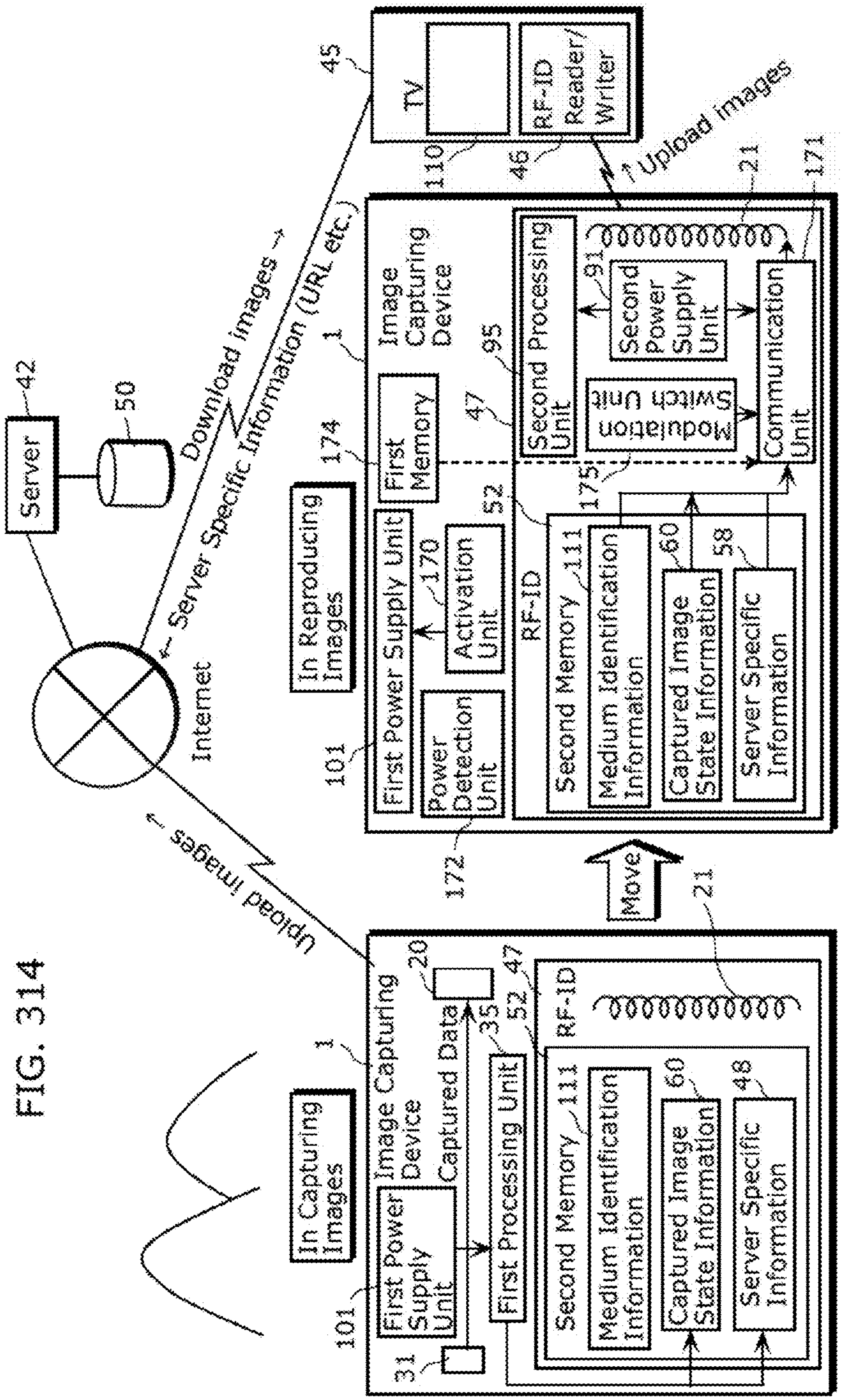

FIG. 314 illustrates an entire system of an image capturing device according to Embodiment A1.

Figure 315:
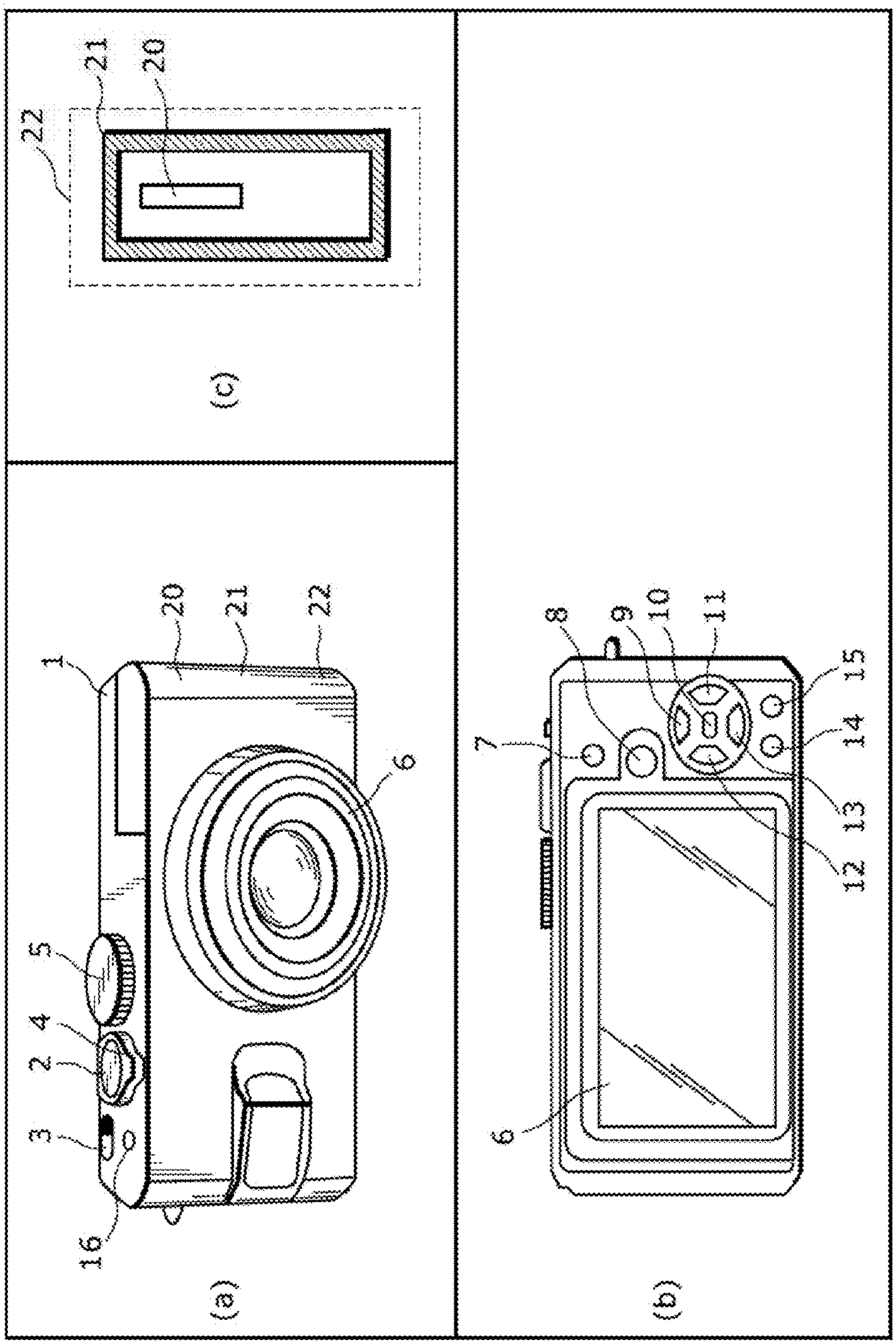

FIG. 315 is an external view of the image capturing device according to Embodiment A1.

Figure 316:
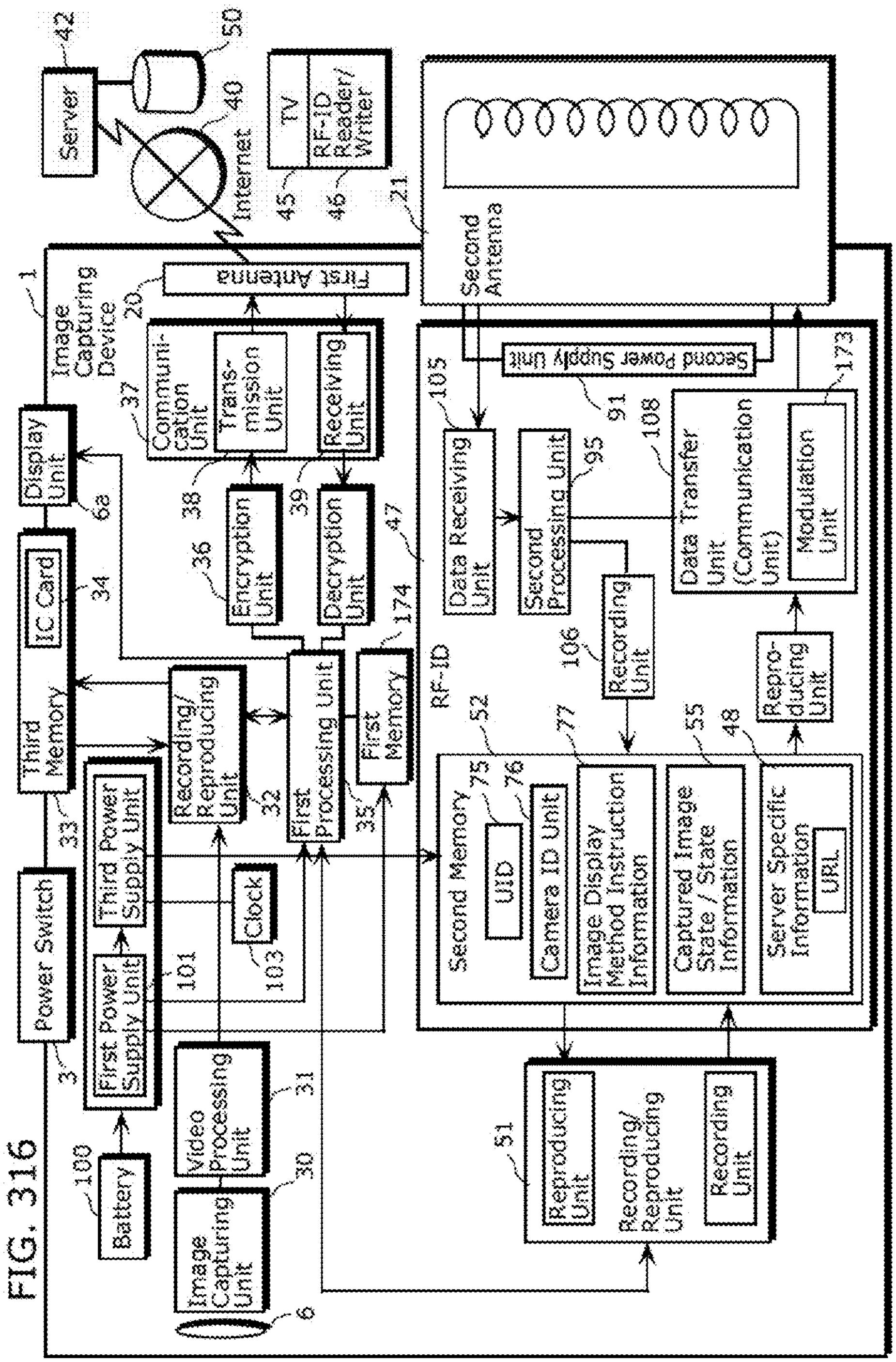

FIG. 316 is a block diagram of the image capturing device according to Embodiment A1.

Figure 317:
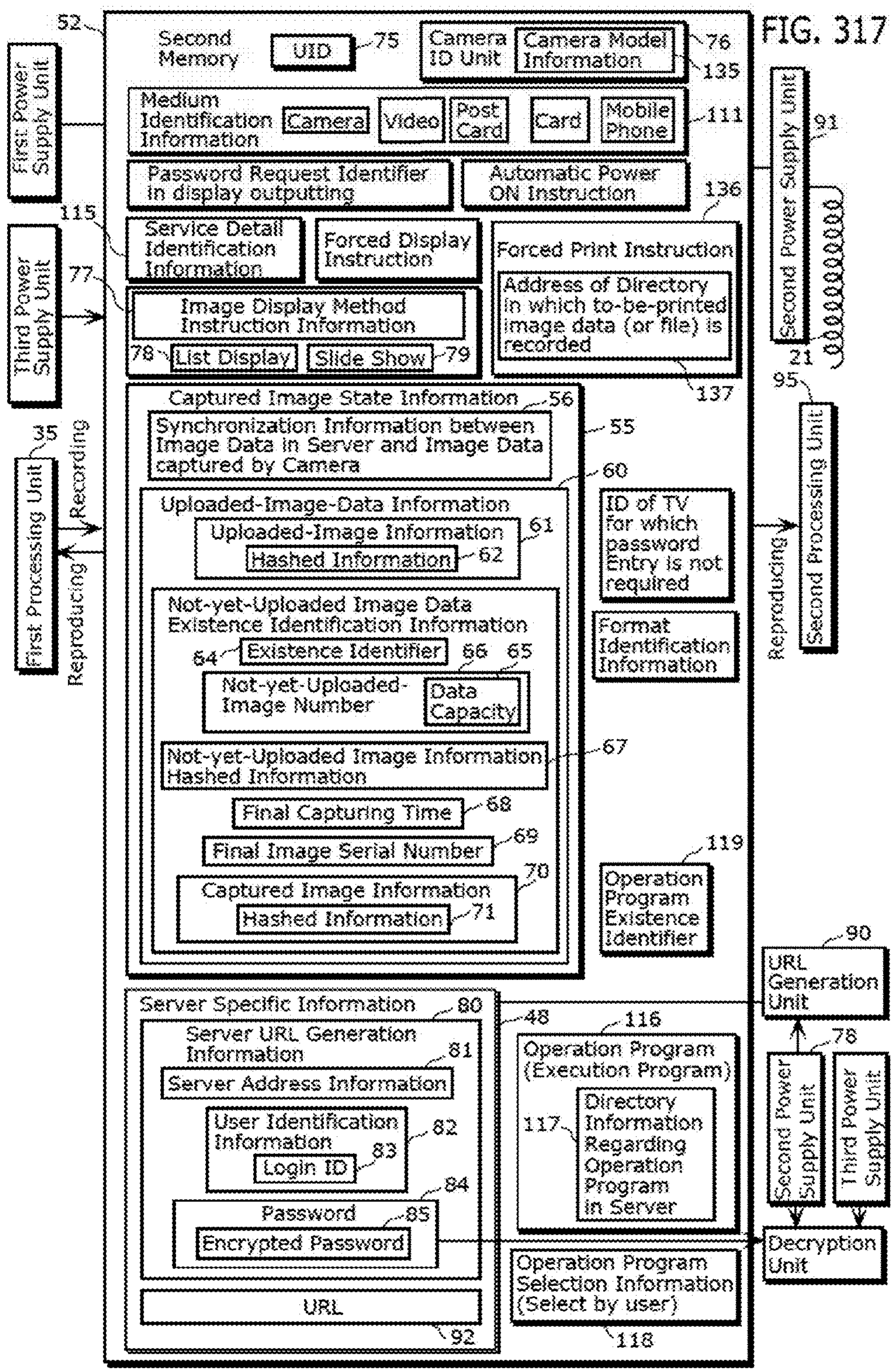

FIG. 317 is a block diagram of a second memory in the image capturing device according to Embodiment A1.

Figure 318:
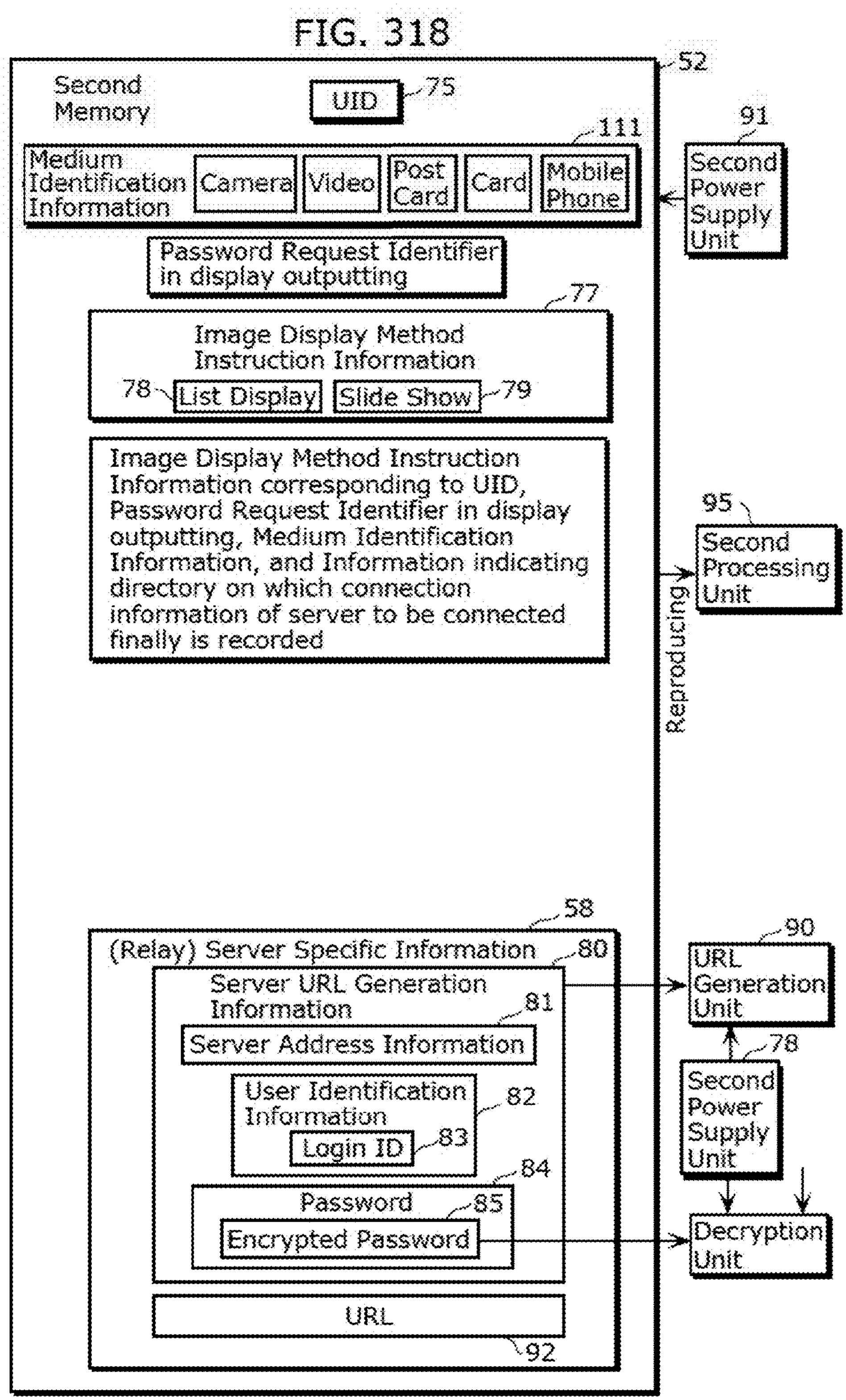

FIG. 318 is a block diagram of the second memory in the image capturing device according to Embodiment A1.

Figure 319:
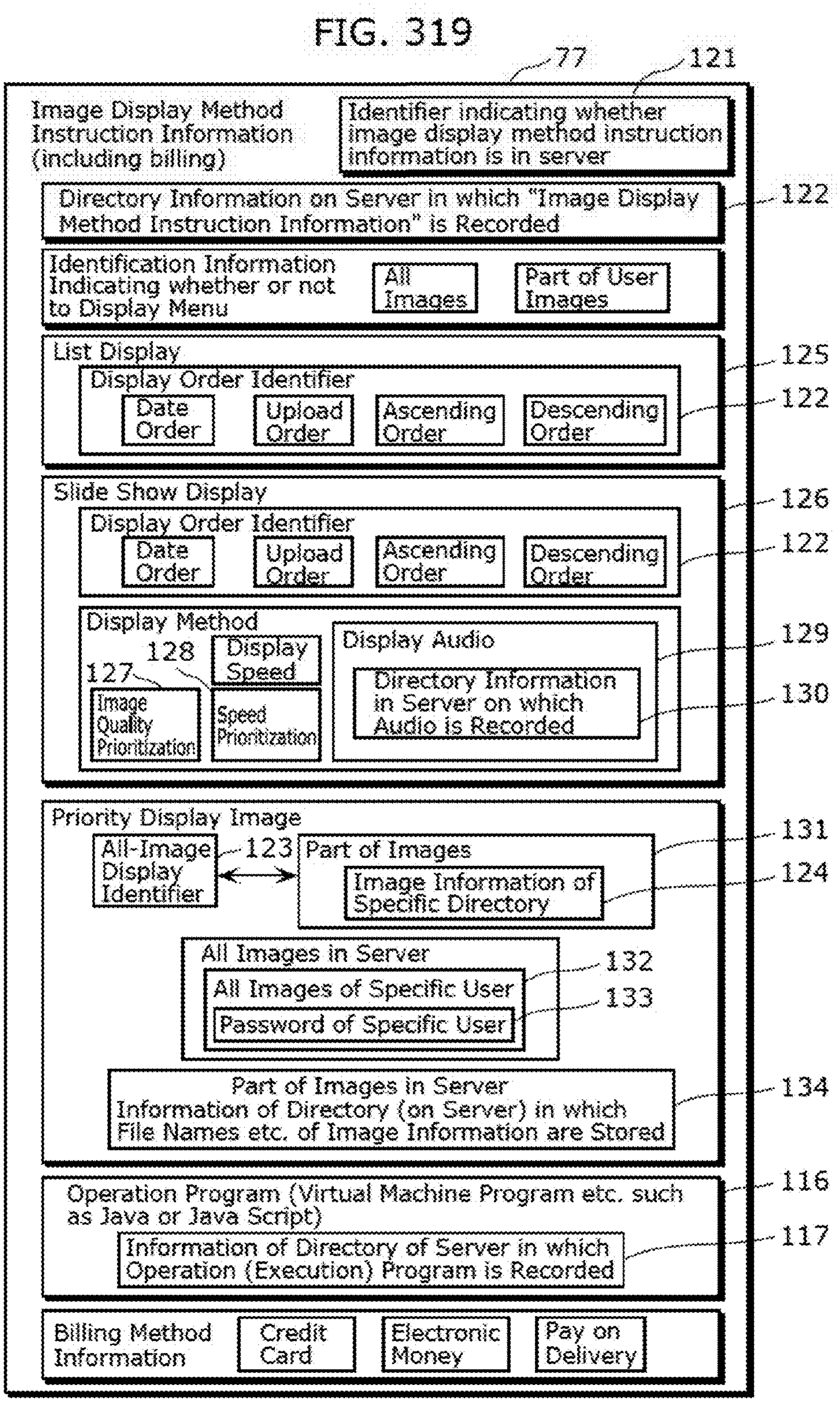

FIG. 319 is a block diagram of image display method instruction information of the image capturing device according to Embodiment A1.

Figure 320:
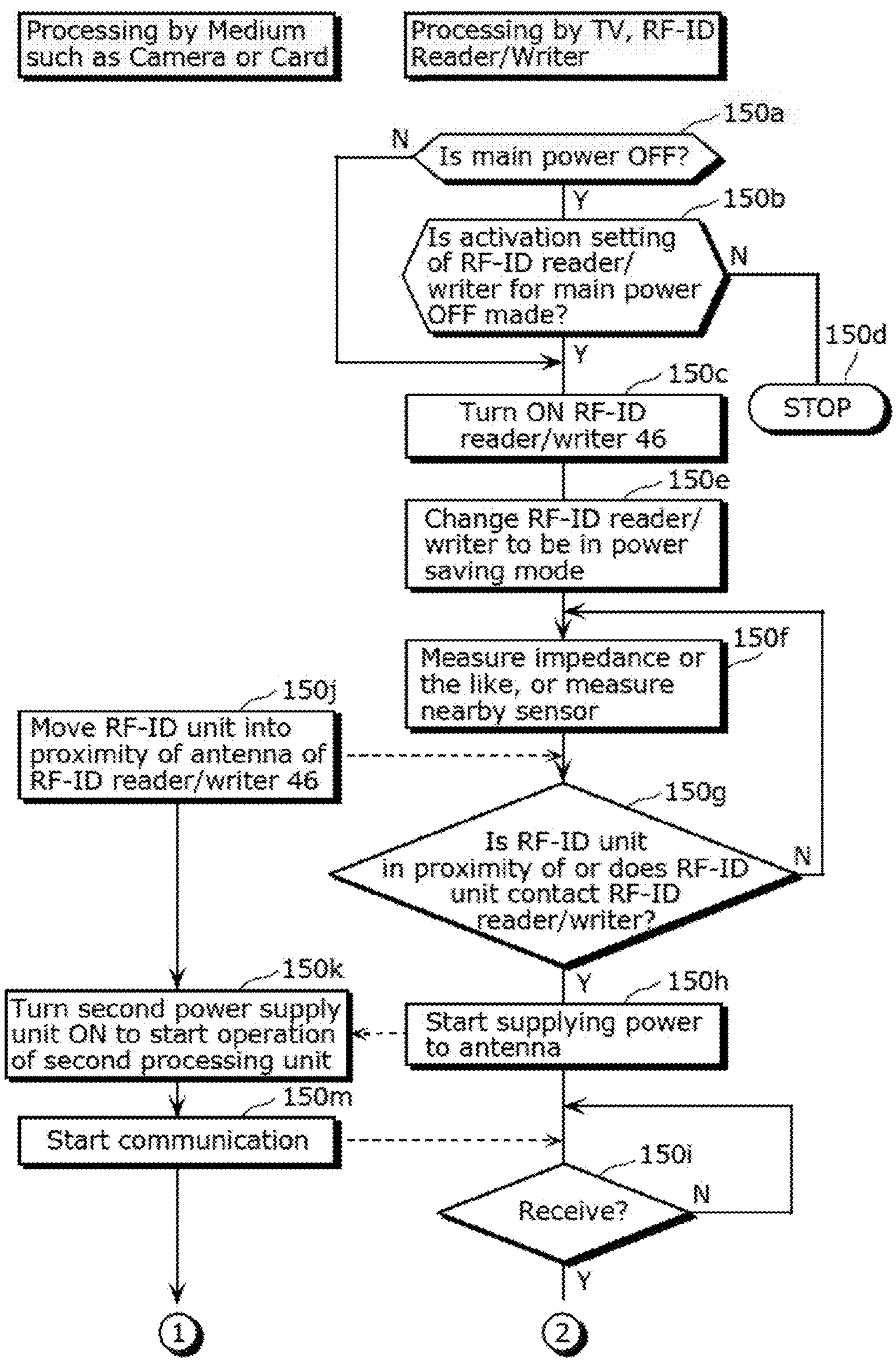

FIG. 320 is a flowchart of processing performed by the image capturing device and a TV, according to Embodiment A1.

Figure 321:
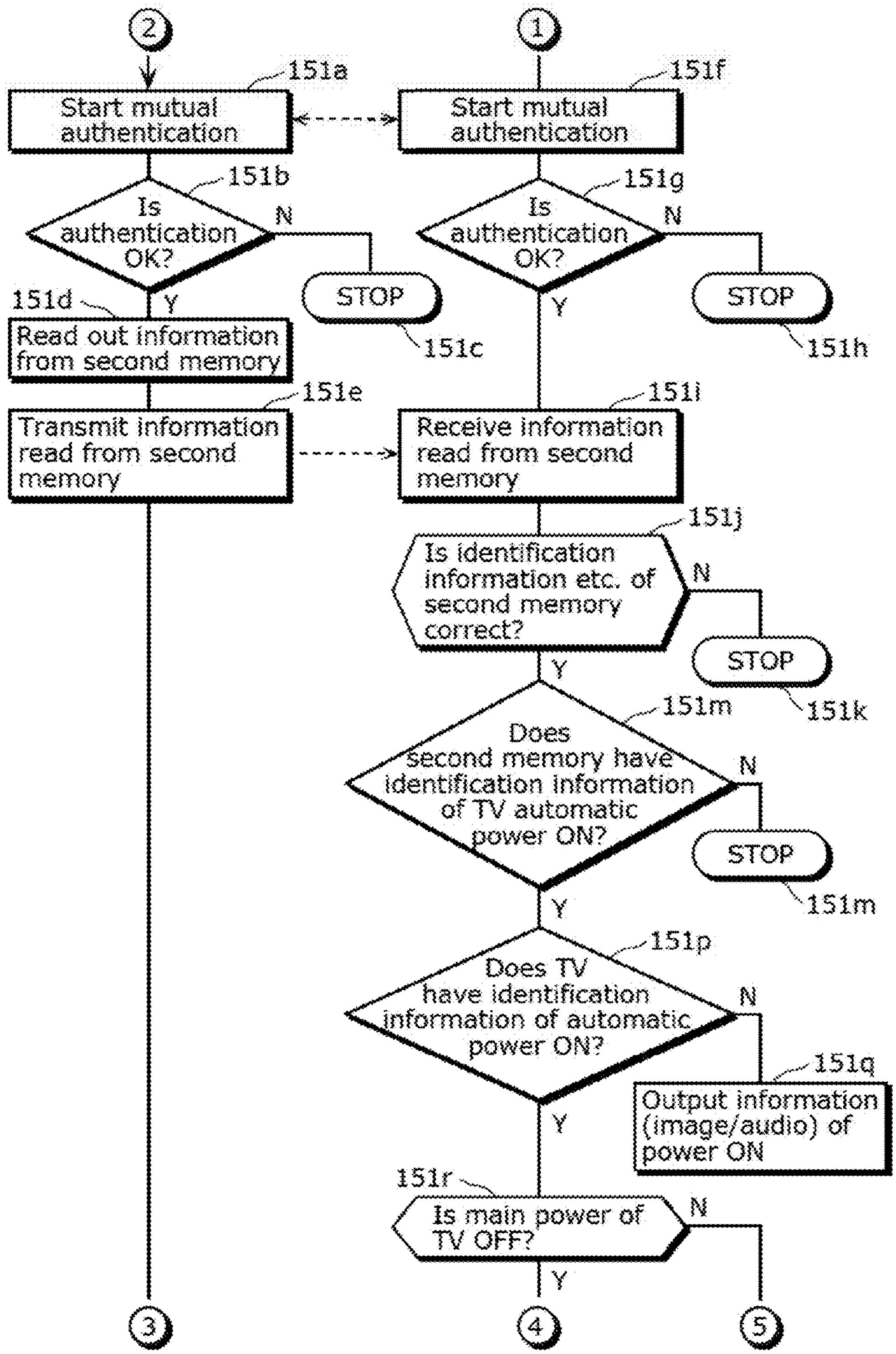

FIG. 321 is a flowchart of the processing performed by the image capturing device and the TV, according to Embodiment A1.

Figure 322:
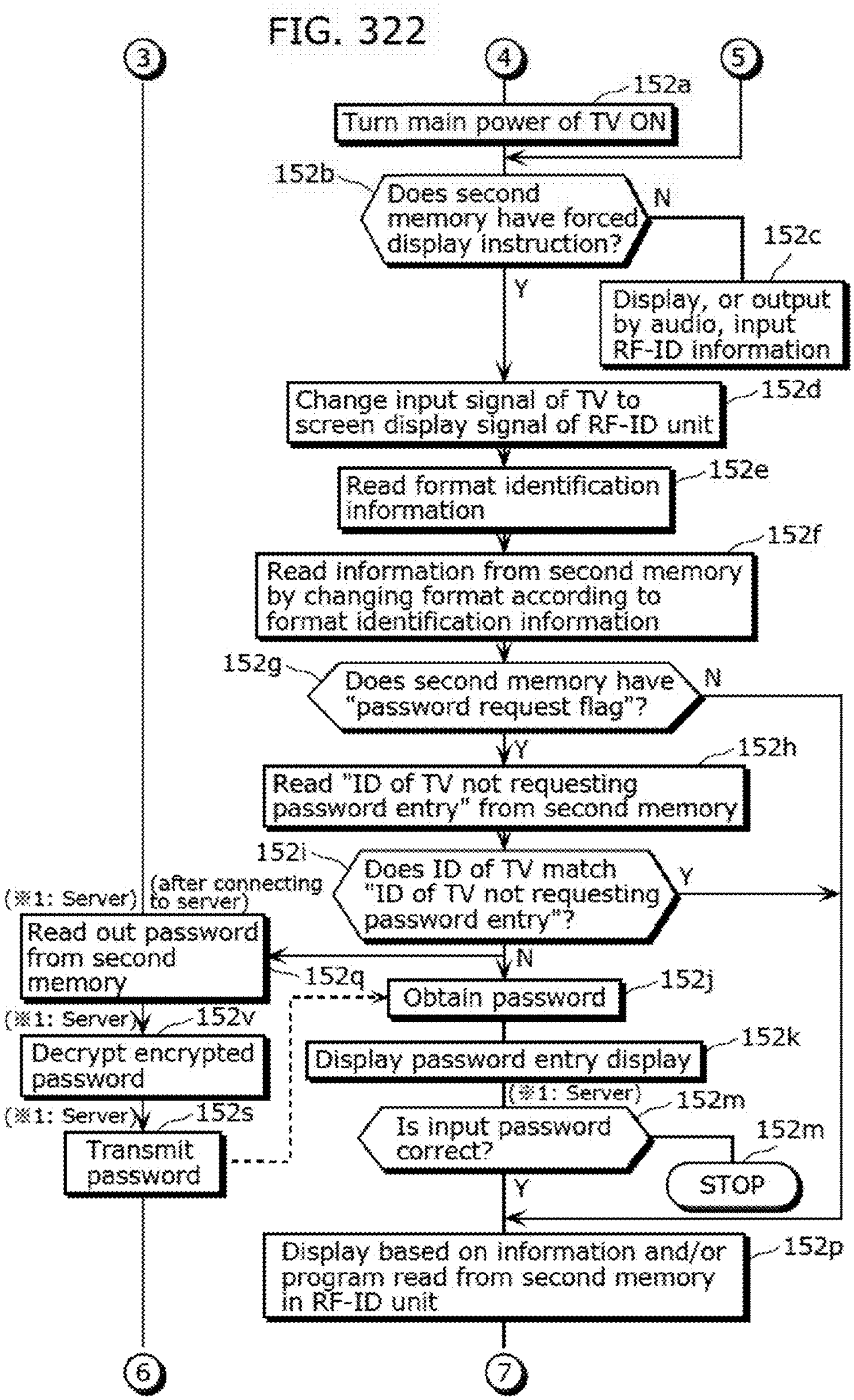

FIG. 322 is a flowchart of the processing performed by the image capturing device and the TV, according to Embodiment A1.

Figure 323:
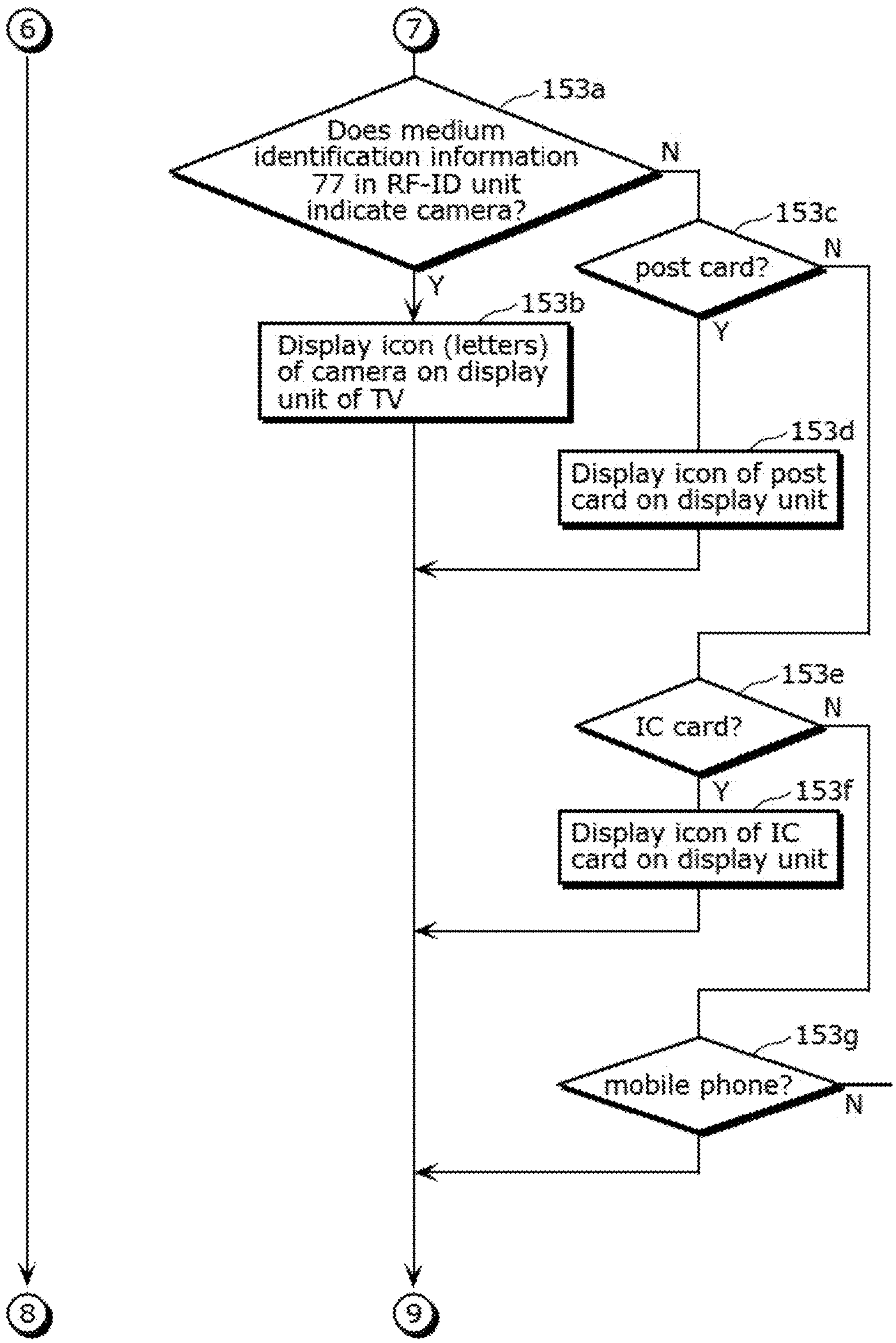

FIG. 323 is a flowchart of the processing performed by the image capturing device and the TV, according to Embodiment A1.

Figure 324:
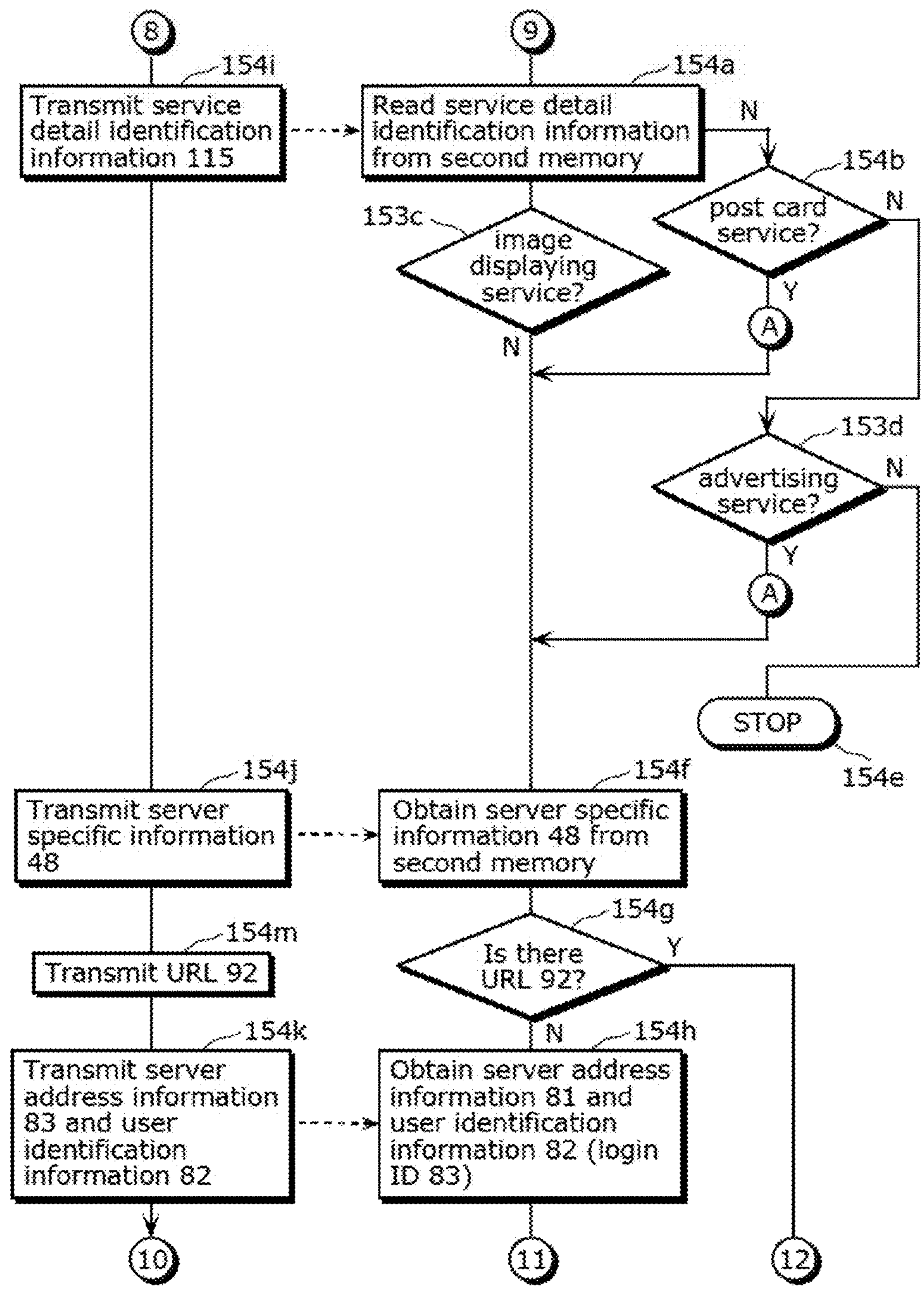

FIG. 324 is a flowchart of the processing performed by the image capturing device and the TV, according to Embodiment A1.

Figure 325:
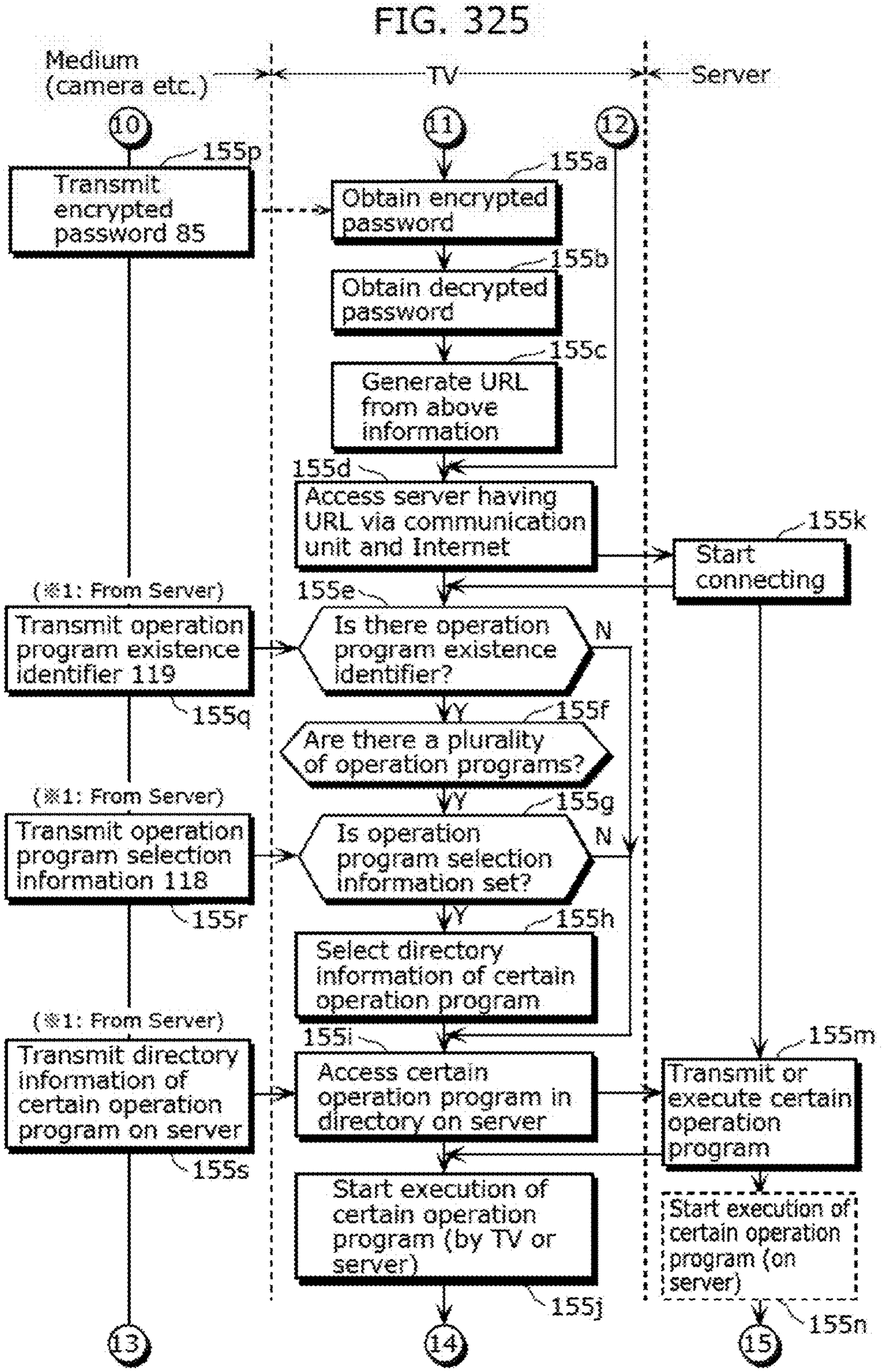

FIG. 325 is a flowchart of the processing performed by the image capturing device and the TV, according to Embodiment A1.

Figure 326:
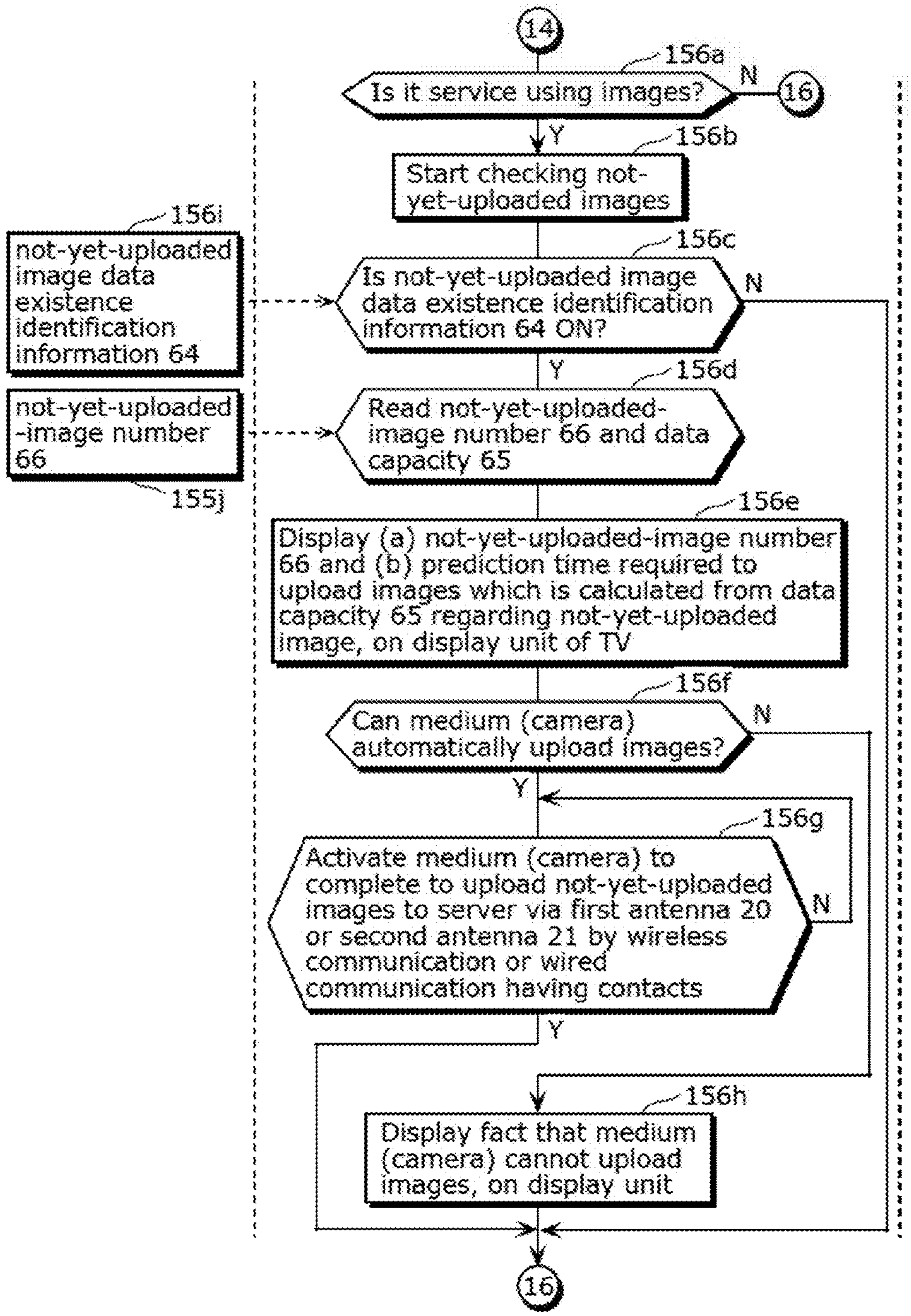

FIG. 326 is a flowchart of the processing performed by the image capturing device and the TV, according to Embodiment A1.

Figure 327:
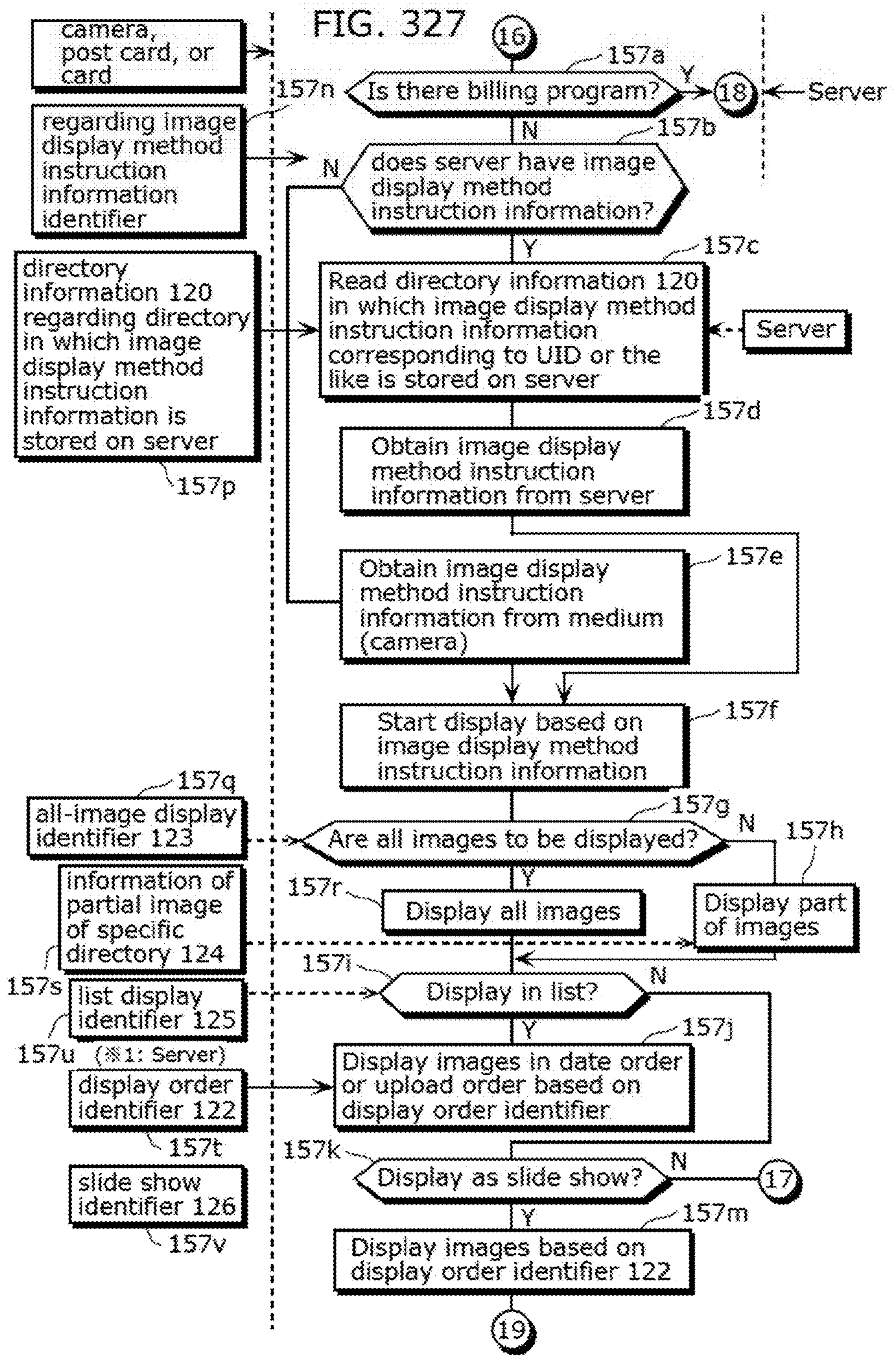

FIG. 327 is a flowchart of the processing performed by the image capturing device and the TV, according to Embodiment A1.

Figure 328:
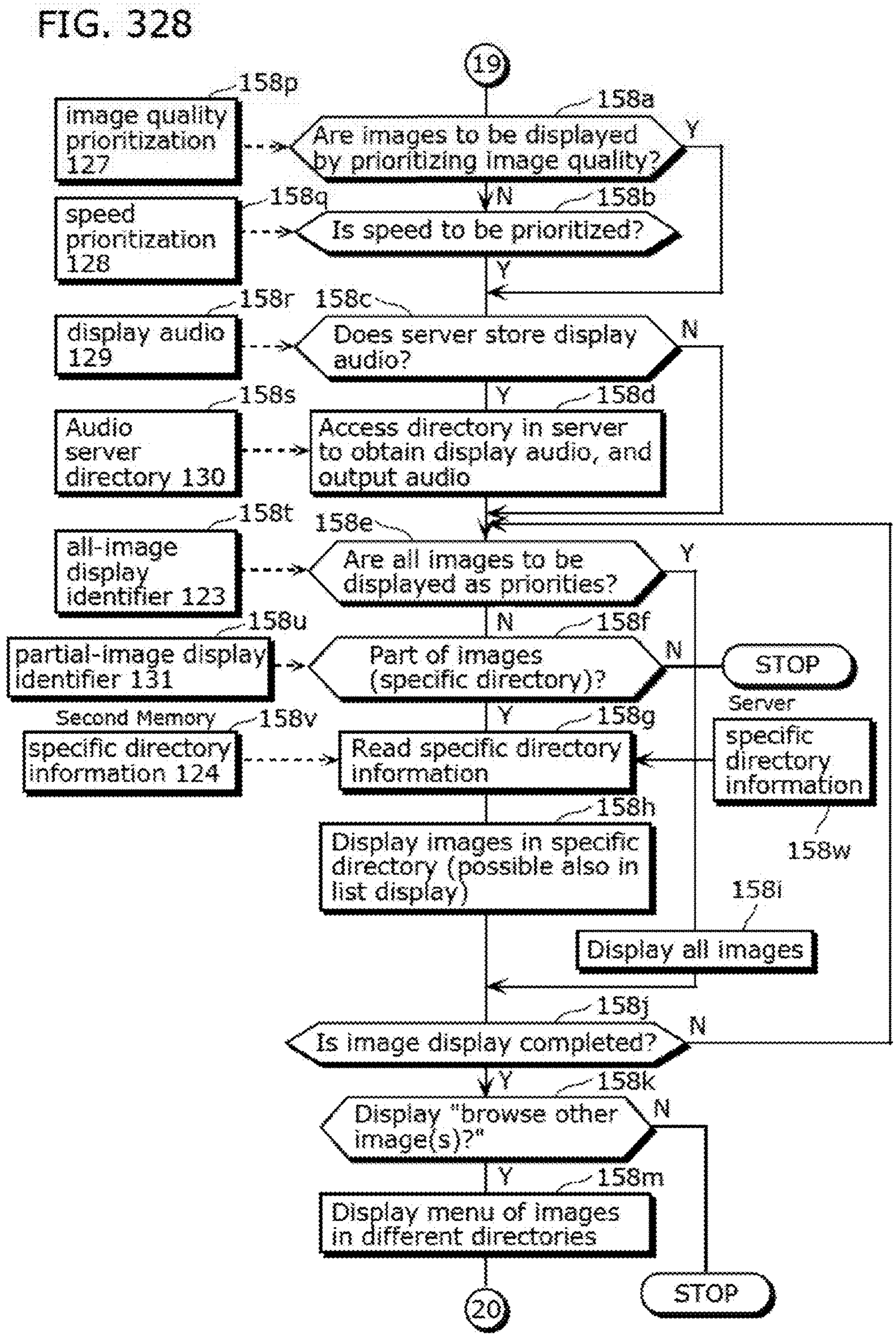

FIG. 328 is a flowchart of the processing performed by the image capturing device and the TV, according to Embodiment A1.

Figure 329:
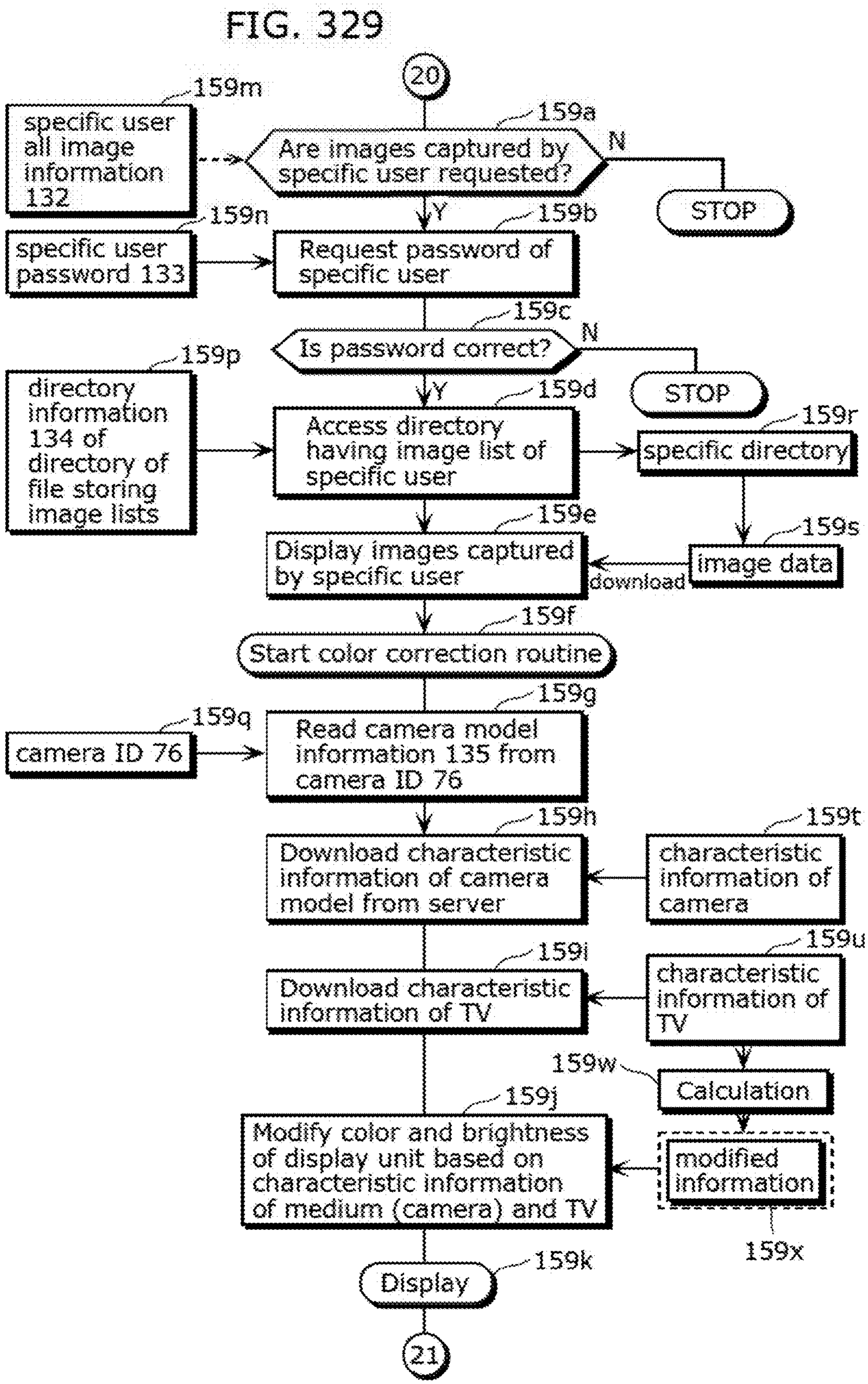

FIG. 329 is a flowchart of the processing performed by the image capturing device and the TV, according to Embodiment A1.

Figure 330:
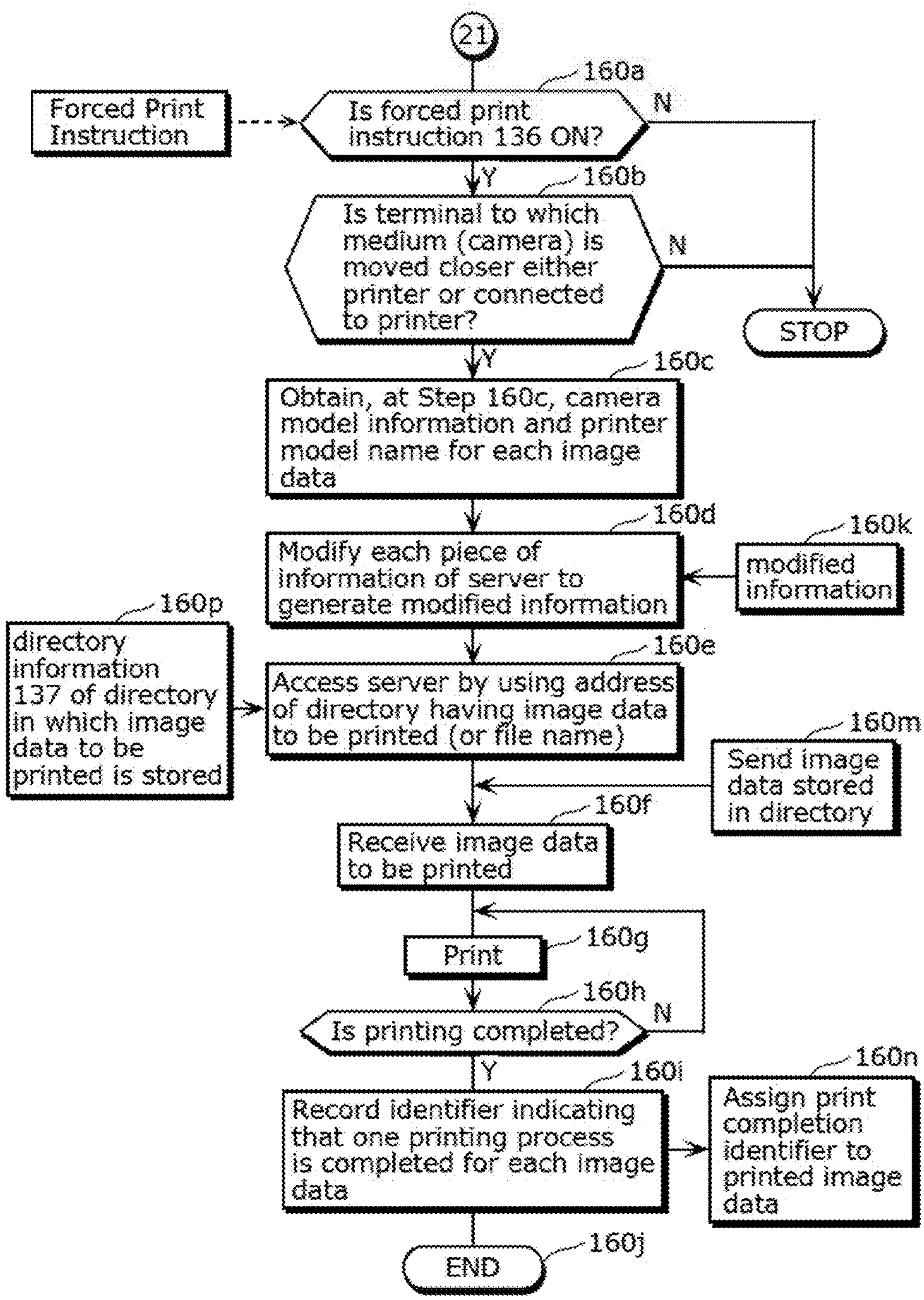

FIG. 330 is a flowchart of the processing performed by the image capturing device and the TV, according to Embodiment A1.

Figure 331:
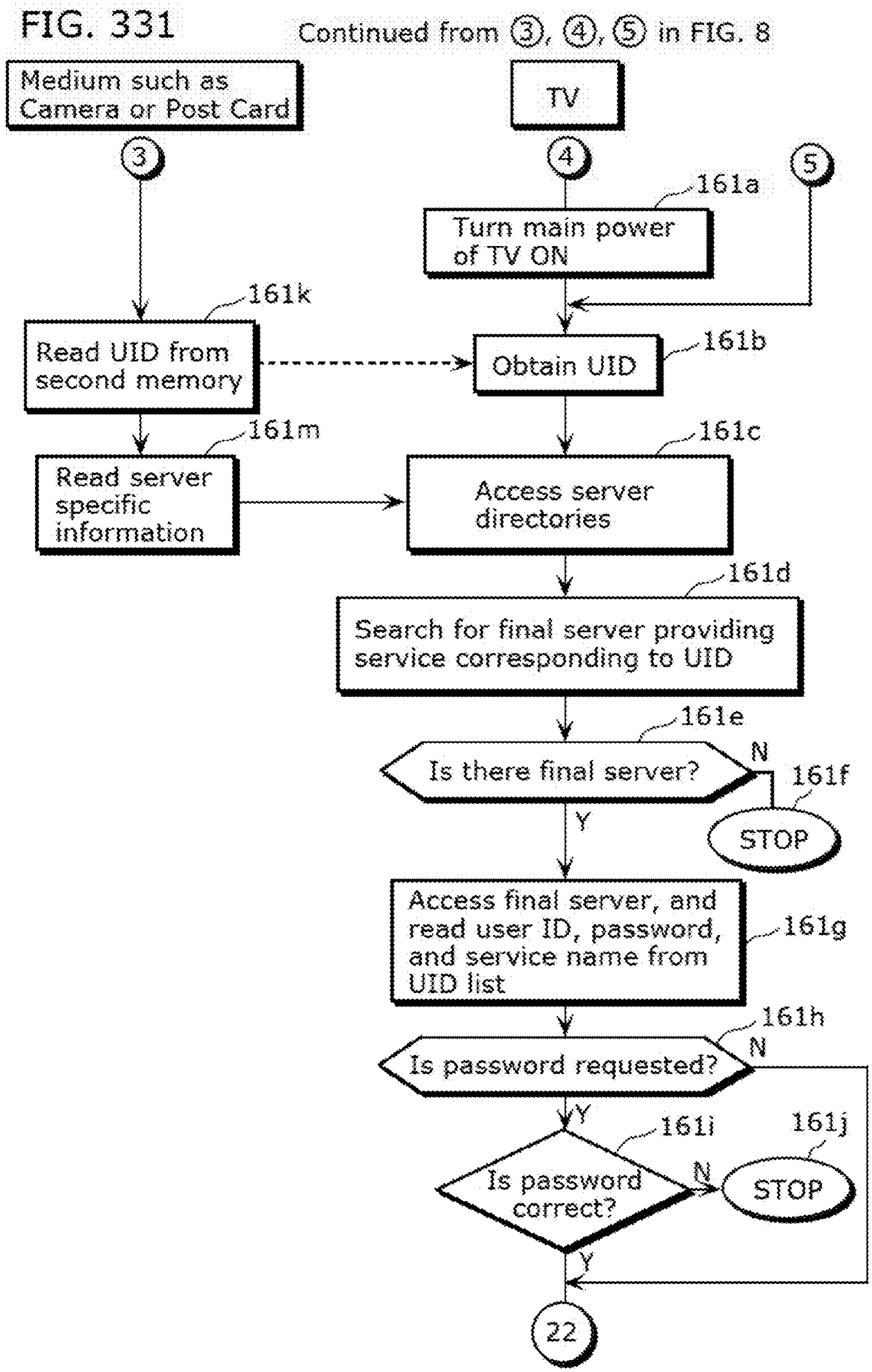

FIG. 331 is a flowchart of the processing performed by the image capturing device and the TV, according to Embodiment A1.

Figure 332:
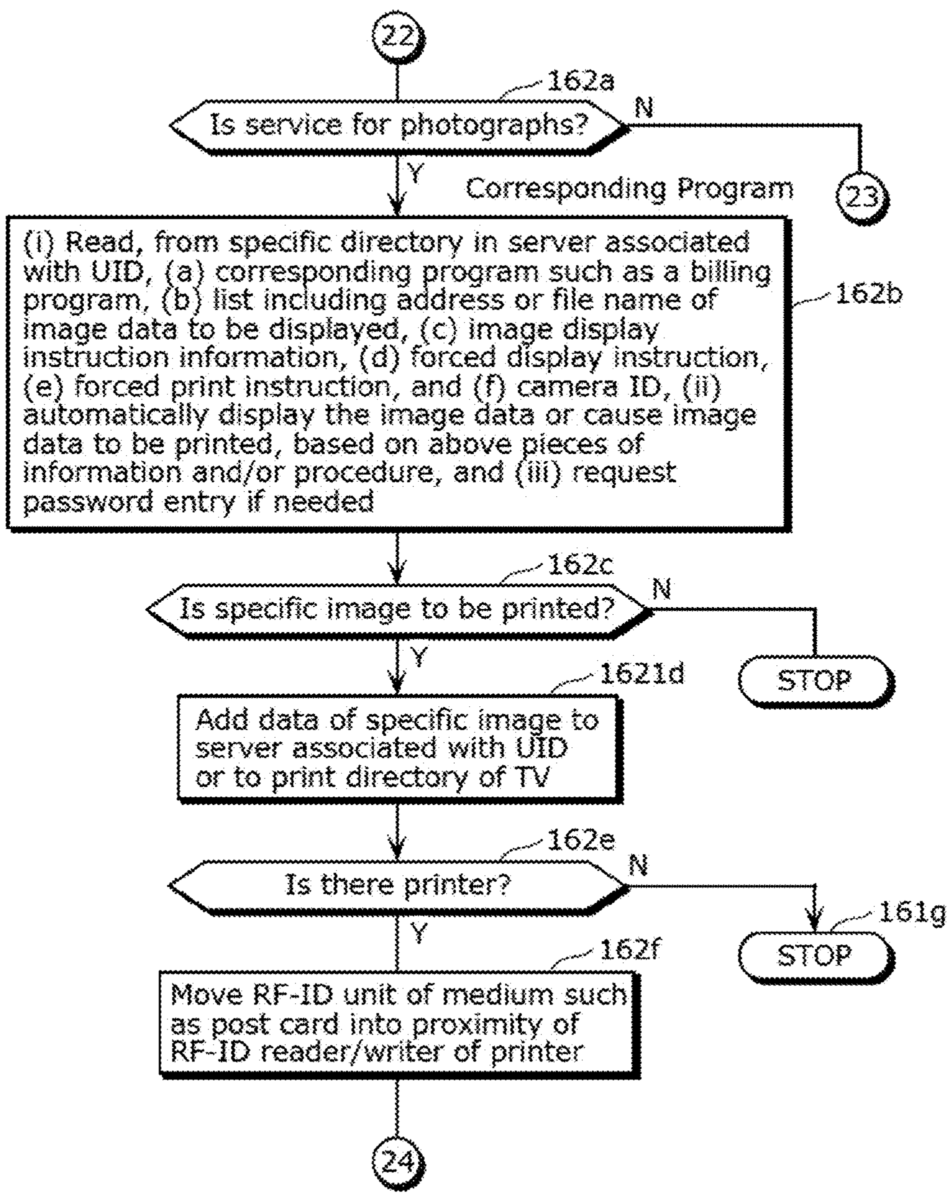

FIG. 332 is a flowchart of the processing performed by the image capturing device and the TV, according to Embodiment A1.

Figure 333:
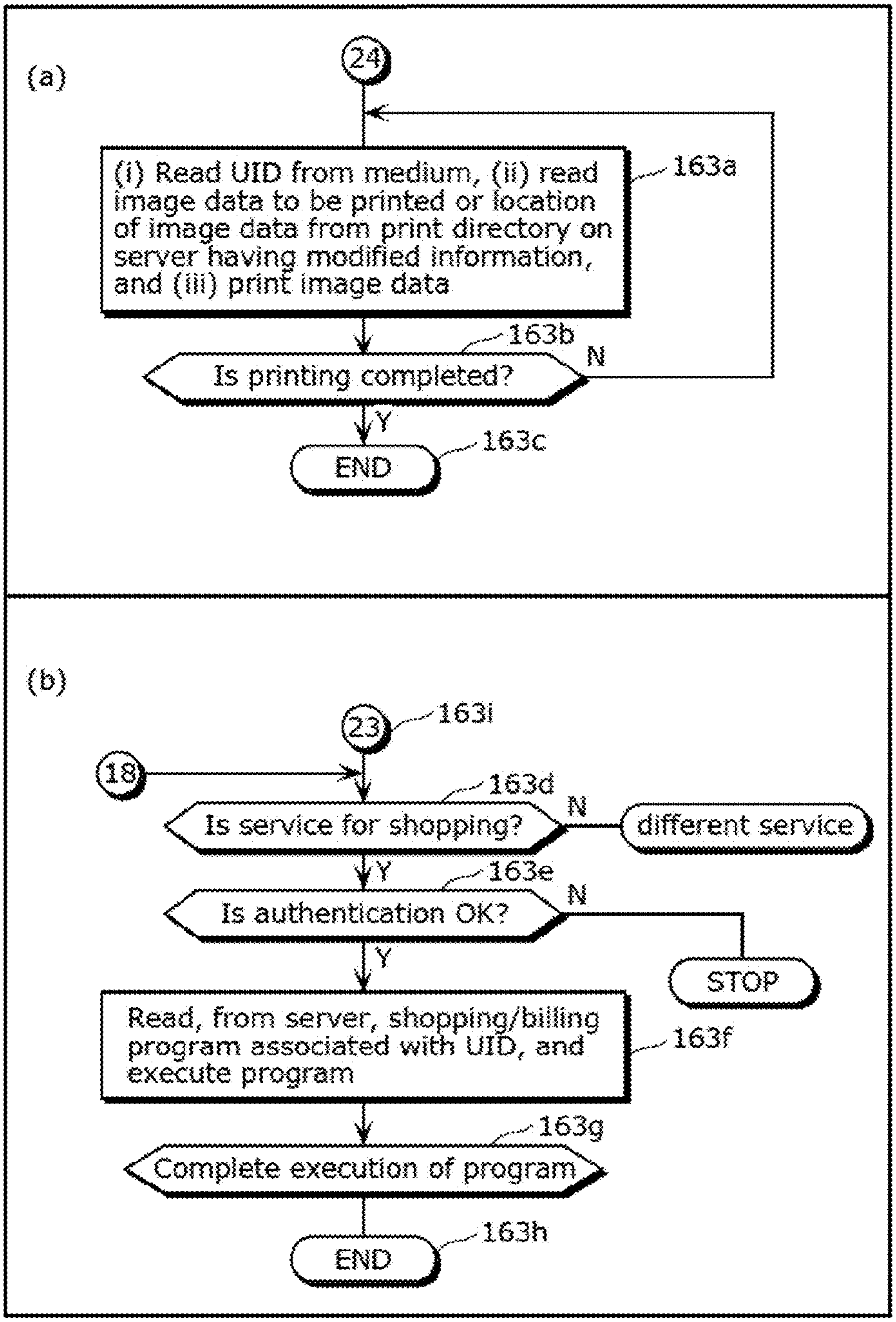

FIG. 333 is a flowchart of the processing performed by the image capturing device and the TV, according to Embodiment A1.

Figure 334:
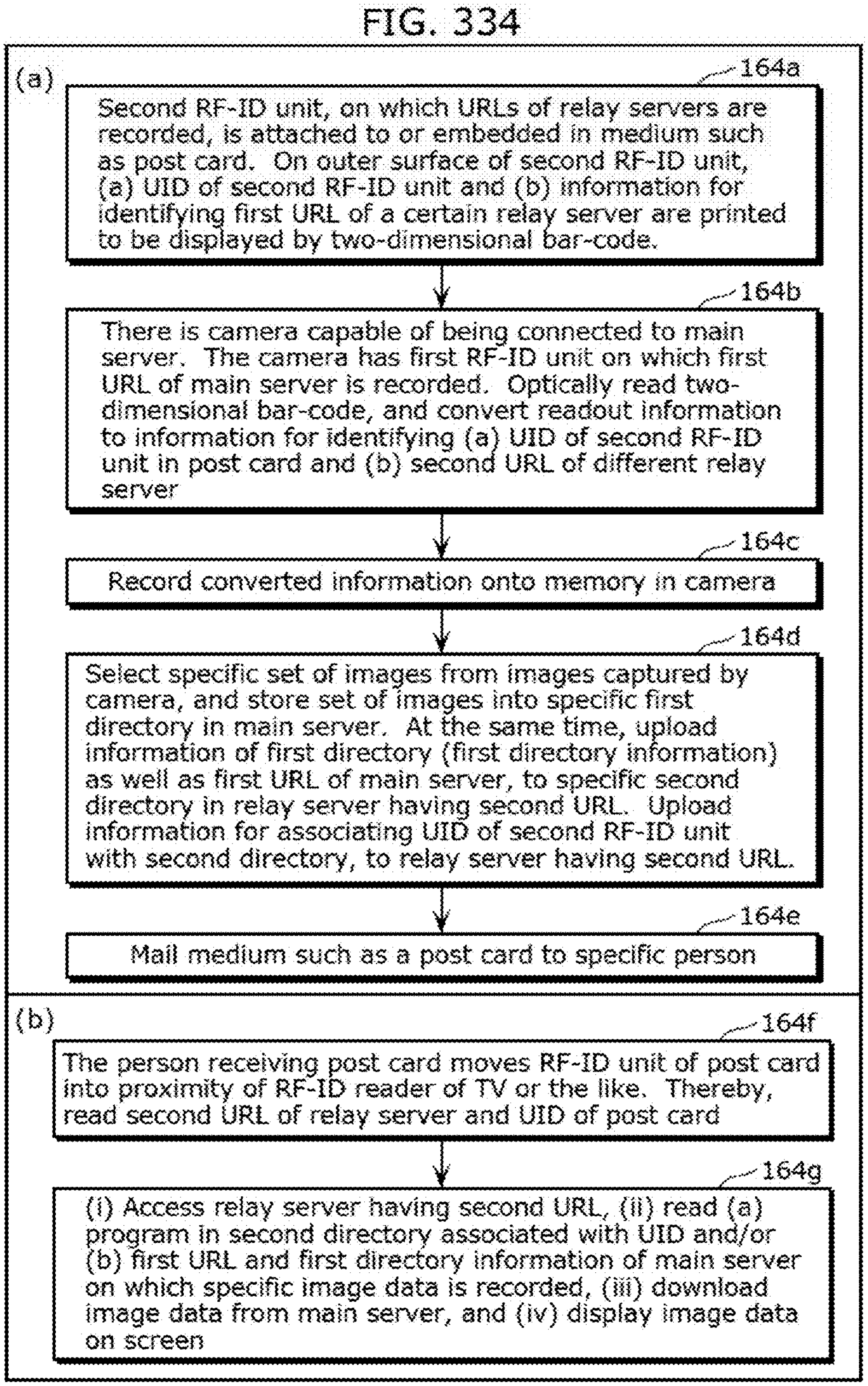

FIG. 334 is a flowchart of the processing performed by the image capturing device and the TV, according to Embodiment A1.

Figure 335:
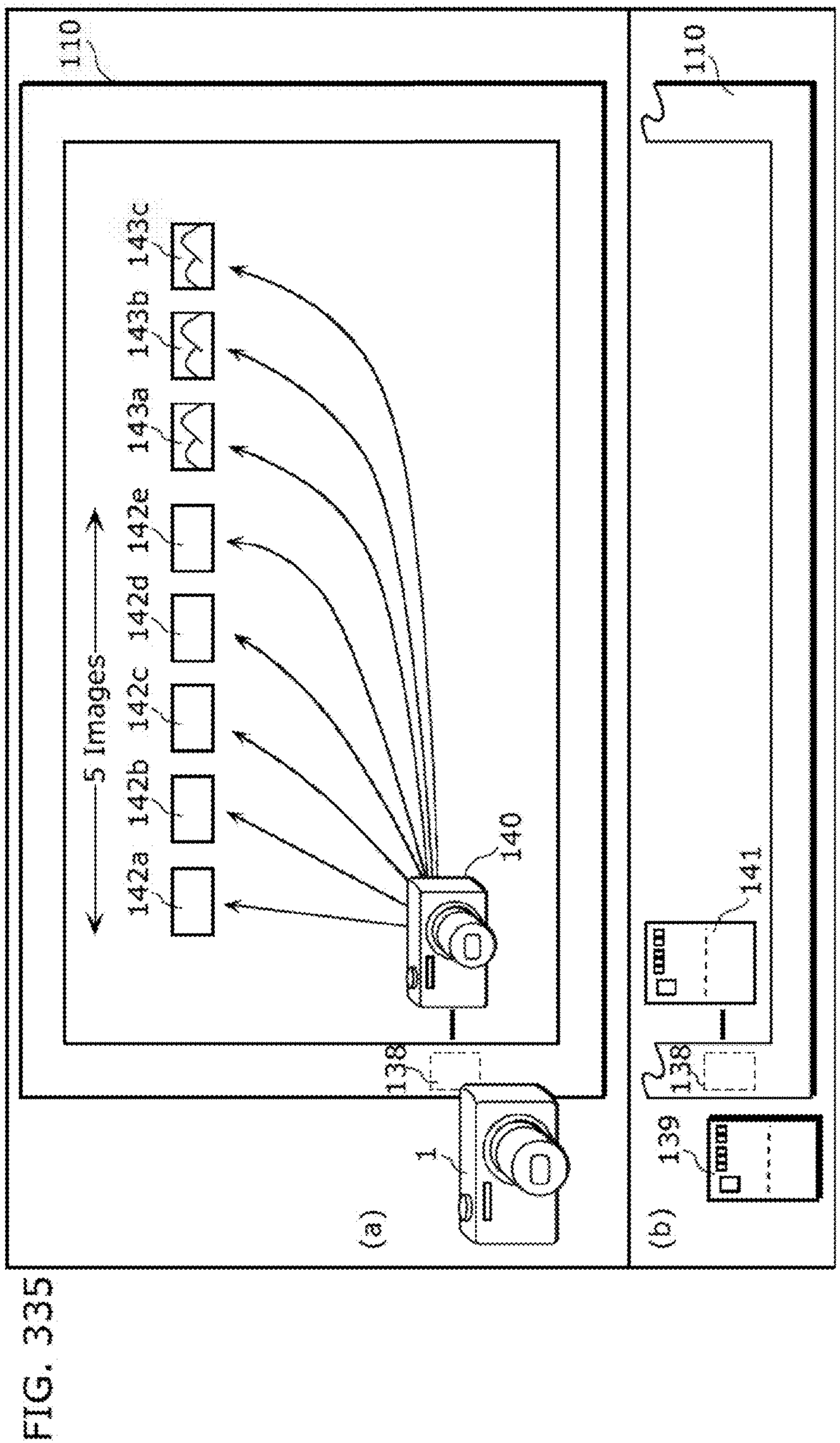

FIG. 335 is a diagram presenting a display method of the image capturing device and the TV, according to Embodiment A1.

Figure 336:
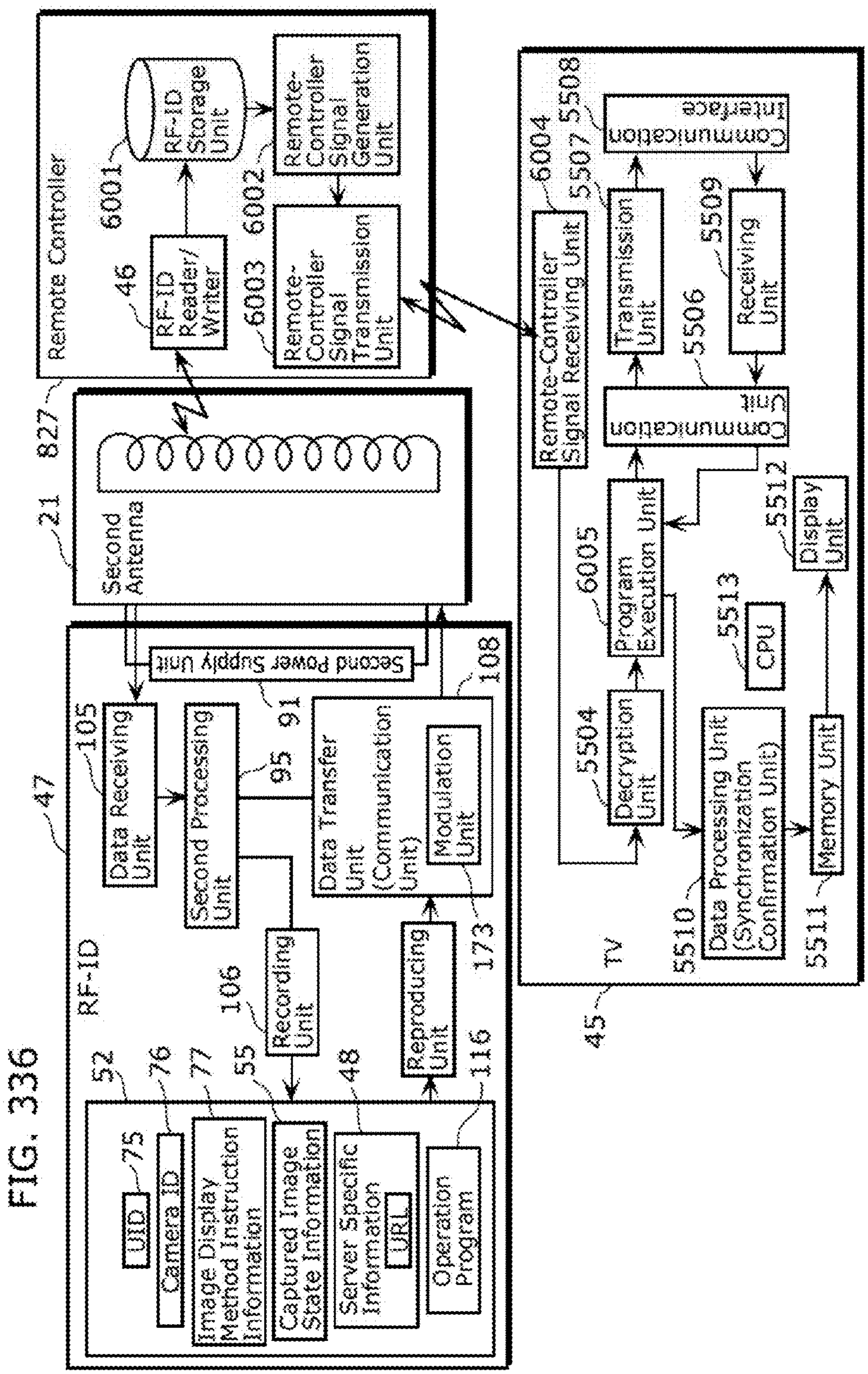

FIG. 336 is a block diagram of a RF-ID unit in the image capturing device for storing an operation program, a remote controller of the TV, and the TV.

Figure 337:
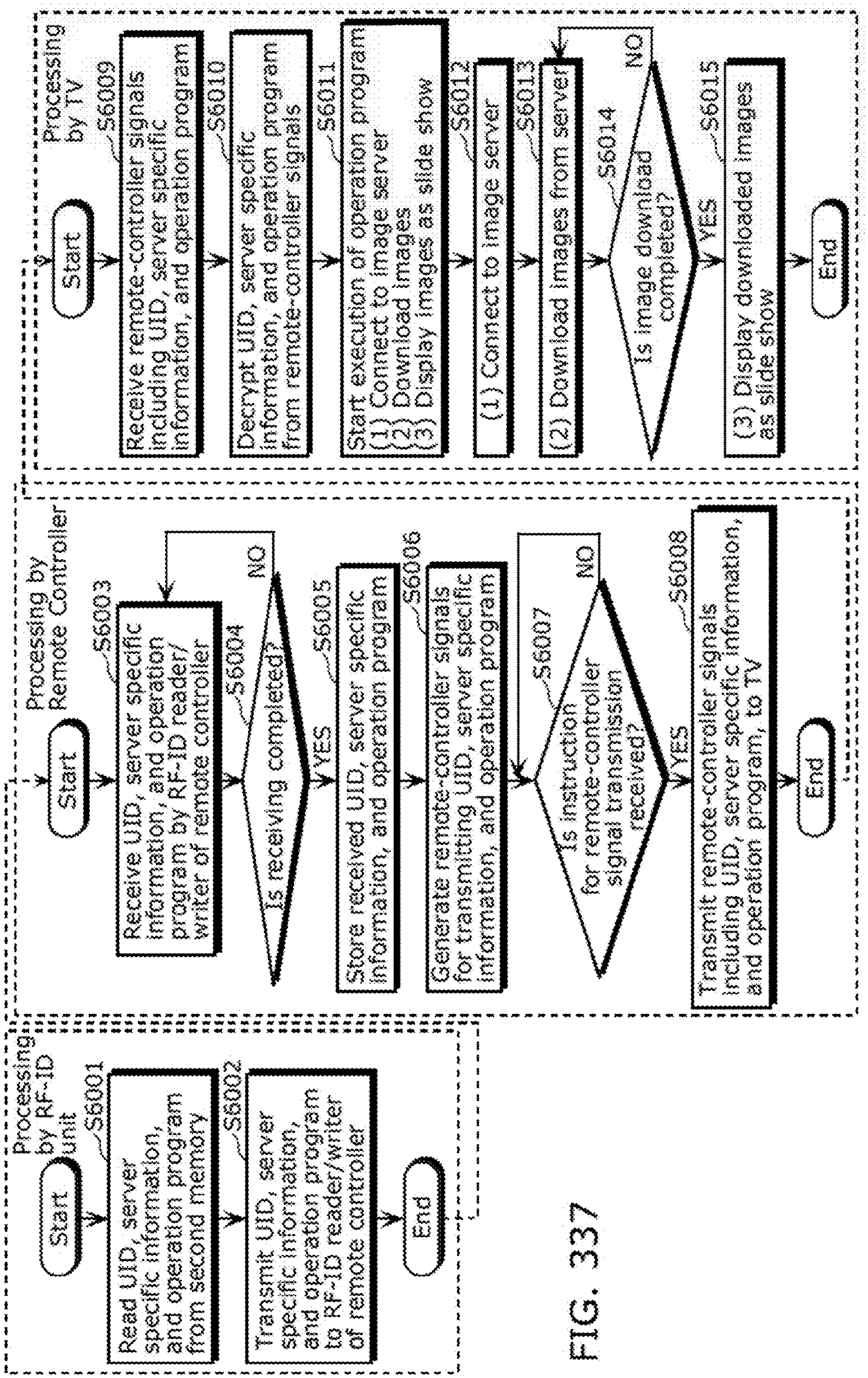

FIG. 337 is a flowchart of processing for transferring and executing the operation program stored in the RF-ID unit.

FIG. 338 presents an example of description of the operation program for downloading image and executing slide show.

Figure 339:
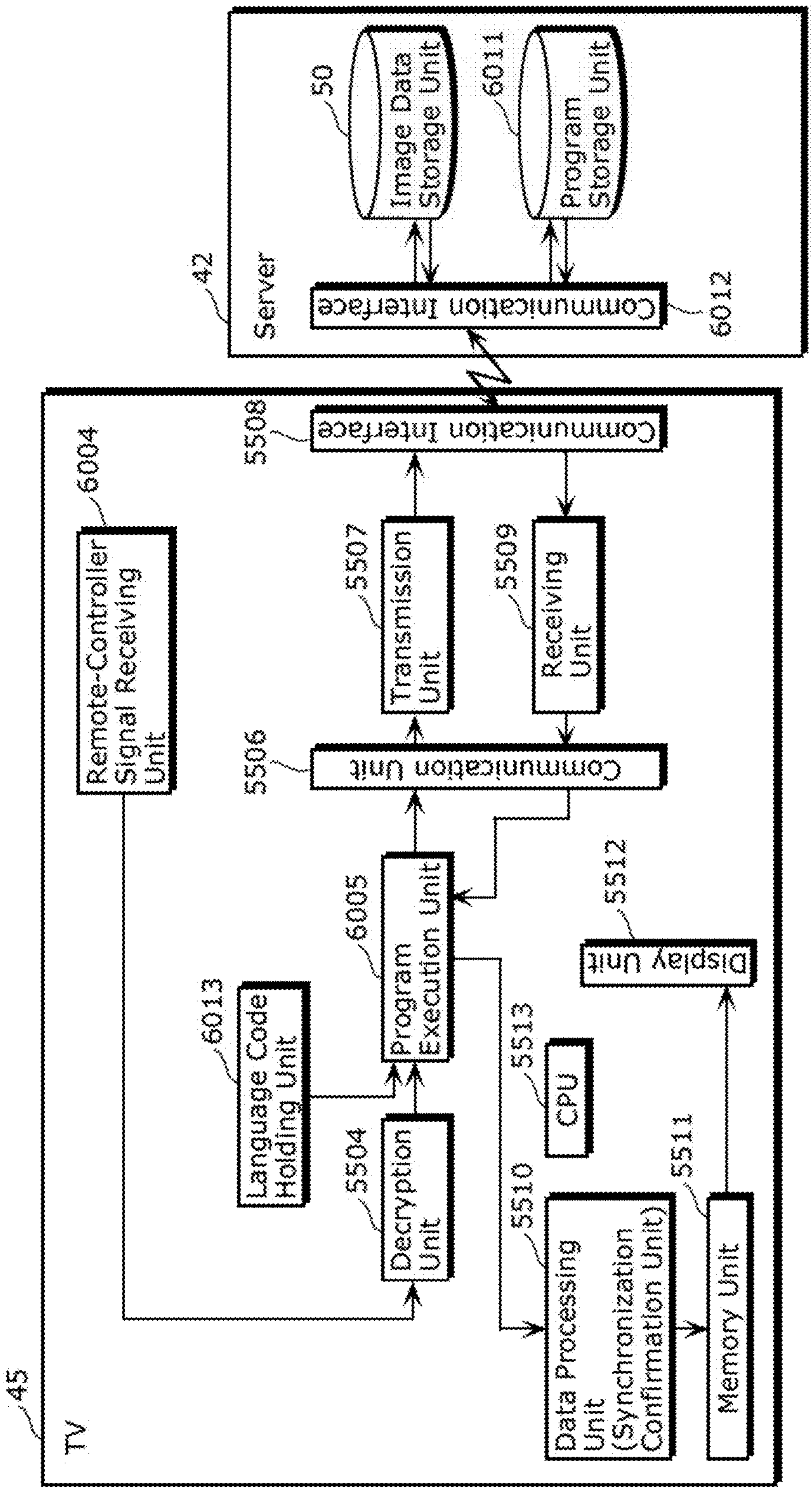

FIG. 339 is a block diagram of (a) the TV changing processing of the operation program according to a language code, and (b) a server storing the program.

Figure 340:
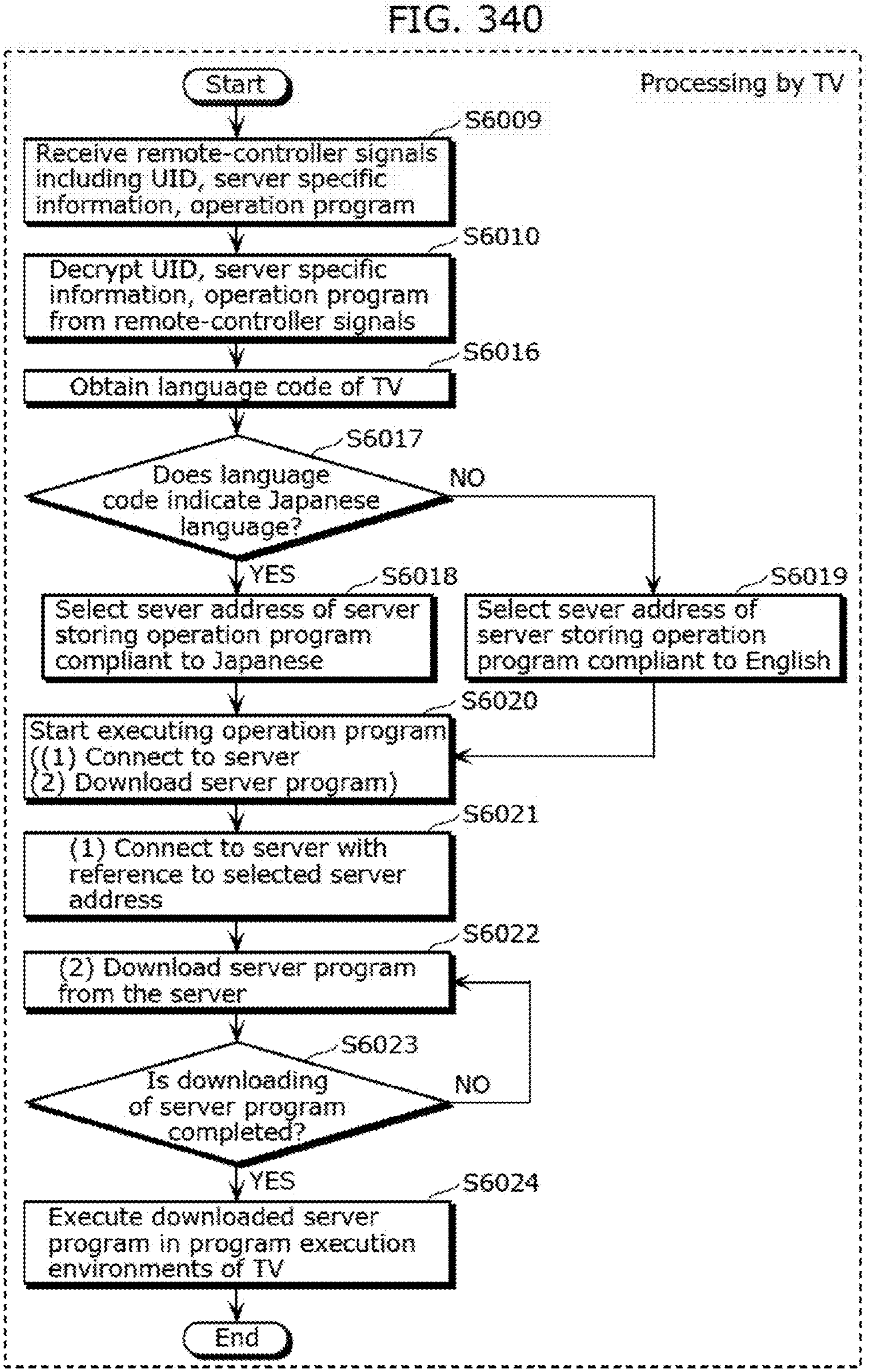

FIG. 340 is a flowchart of processing for changing processing of the operation program according to a language code.

Figure 341:
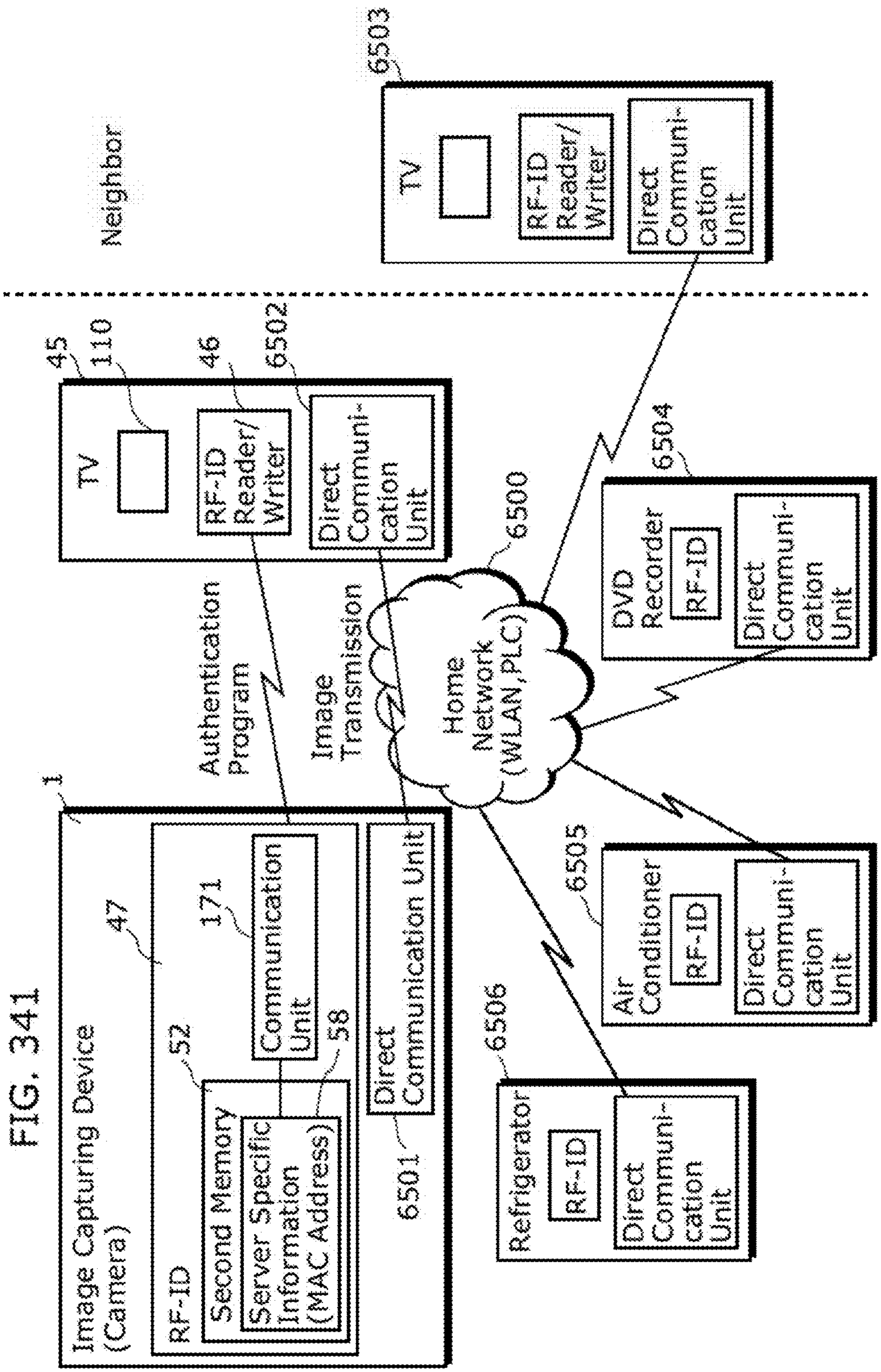

FIG. 341 is a block diagram of a home network 6500 connecting the image capturing device to the TV by a wireless LAN.

Figure 342:
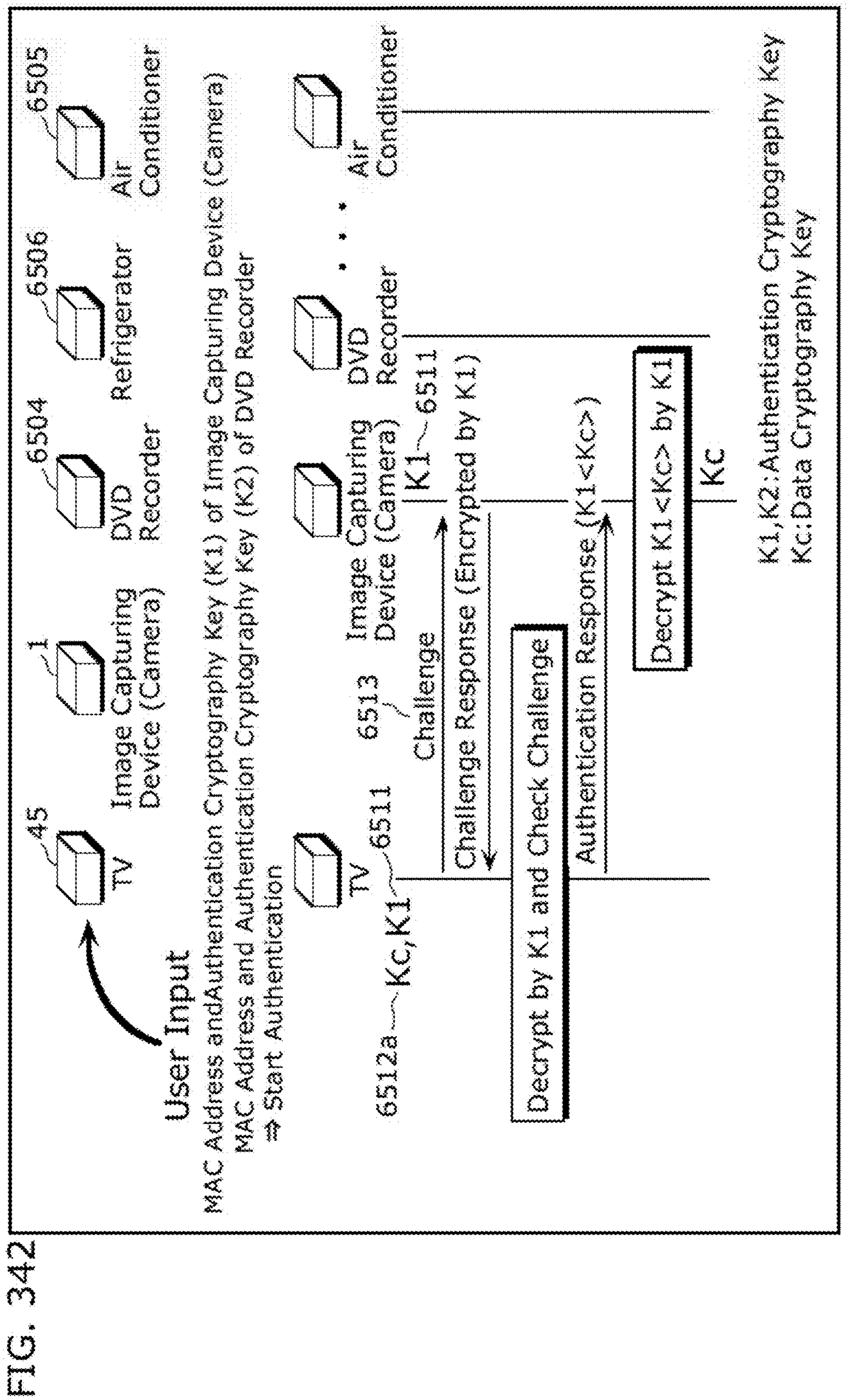

FIG. 342 presents an example of an authentication method without using RF-ID unit.

Figure 343:
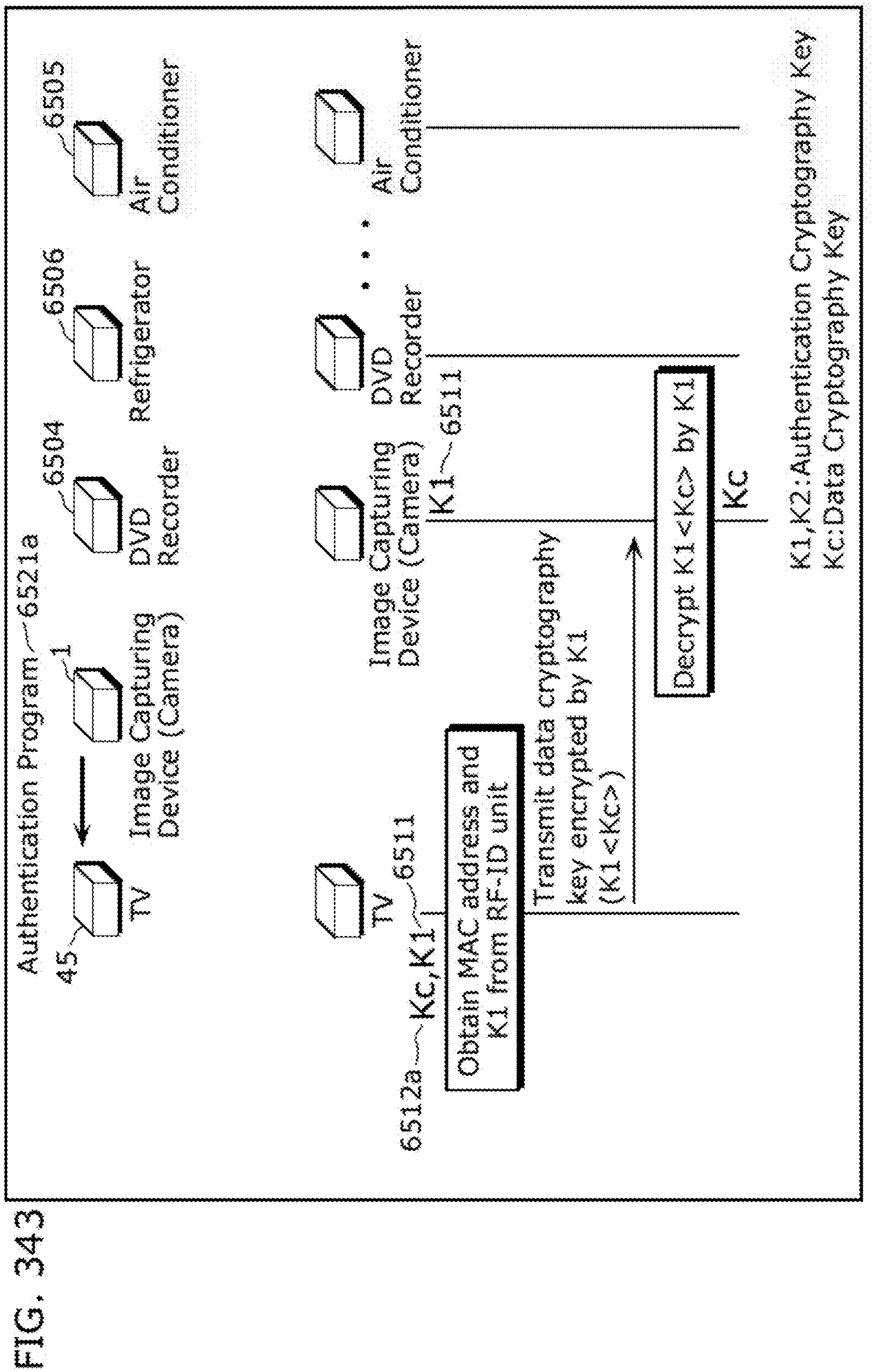

FIG. 343 presents an example of an authentication method using RF-ID unit.

Figure 344:
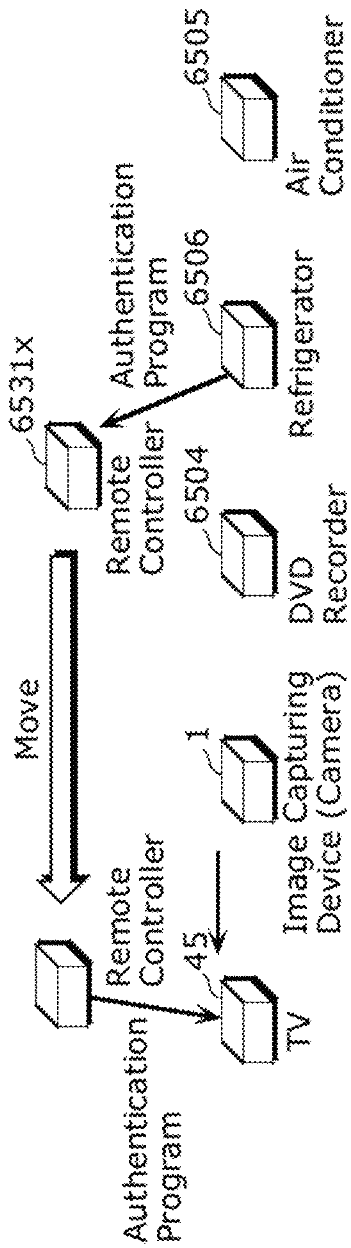

FIG. 344 presents an example of an authentication method used when it is difficult to move a terminal into proximity of another terminal.

Figure 345:
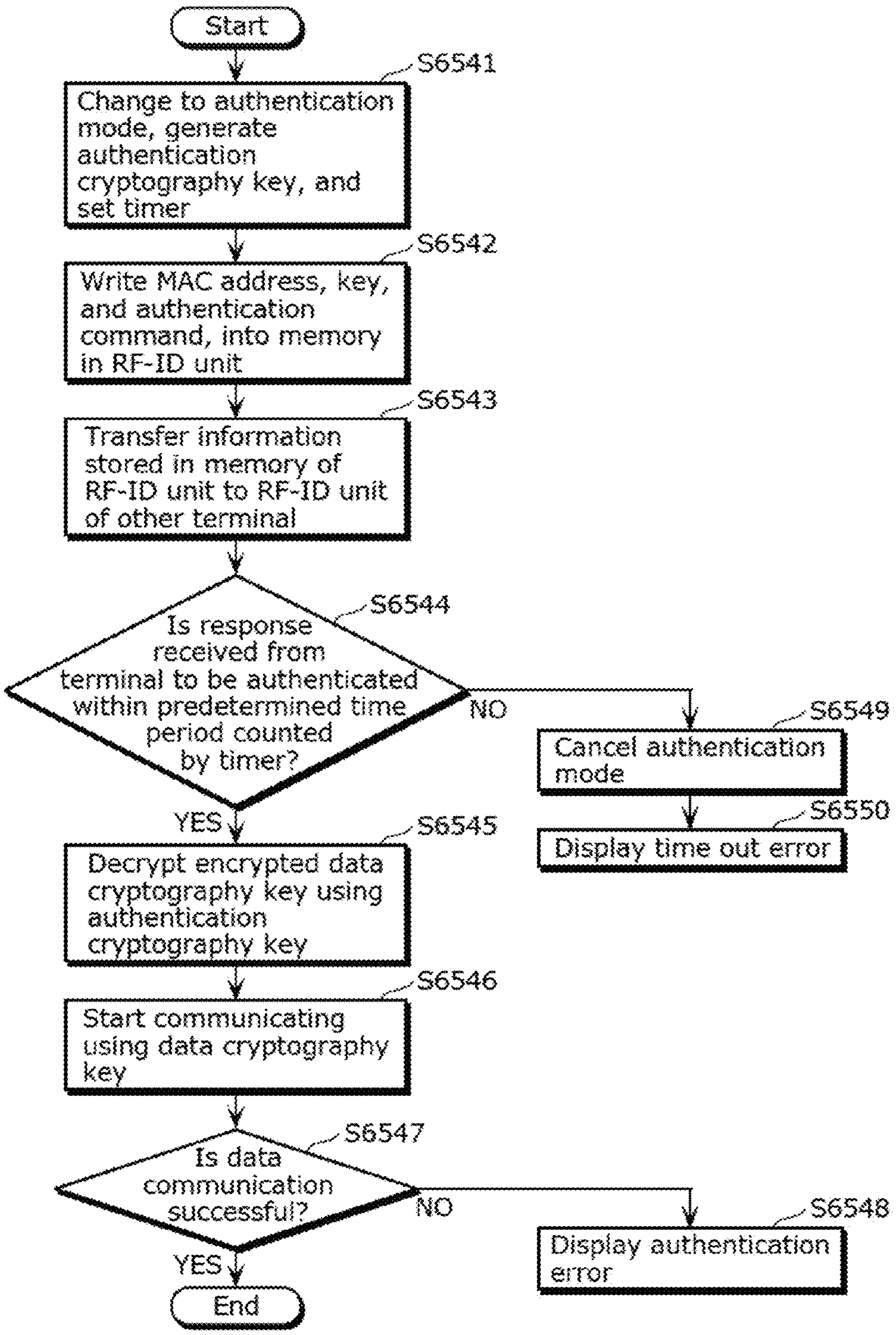

FIG. 345 is a flowchart of an example of processing performed by a camera.

Figure 346:
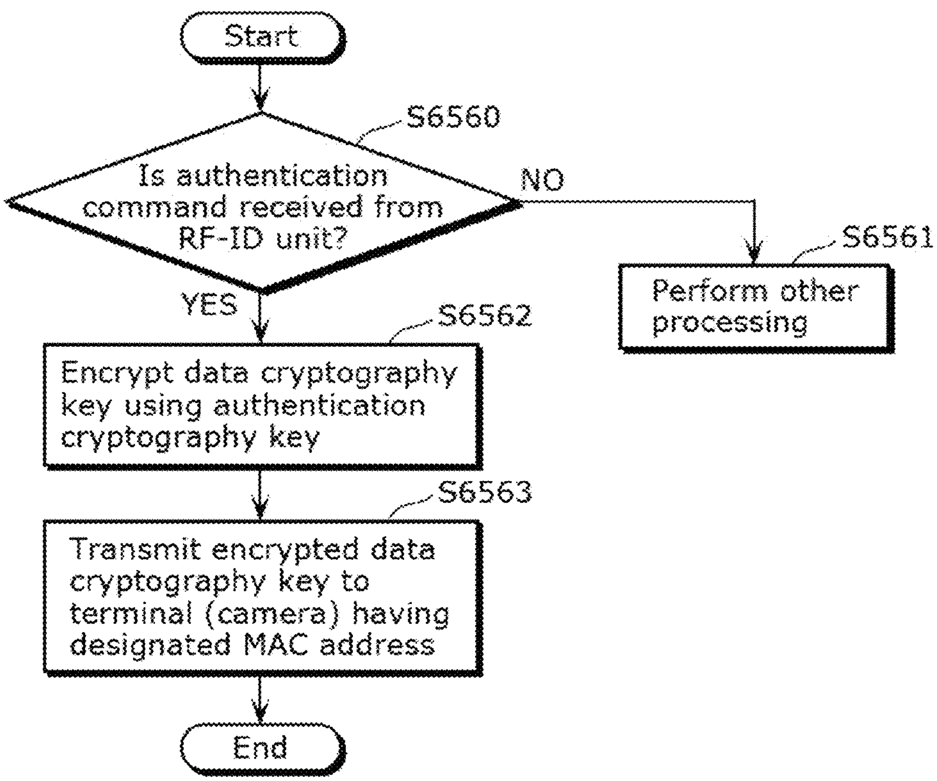

FIG. 346 is a flowchart of an example of processing performed by the TV.

Figure 347:
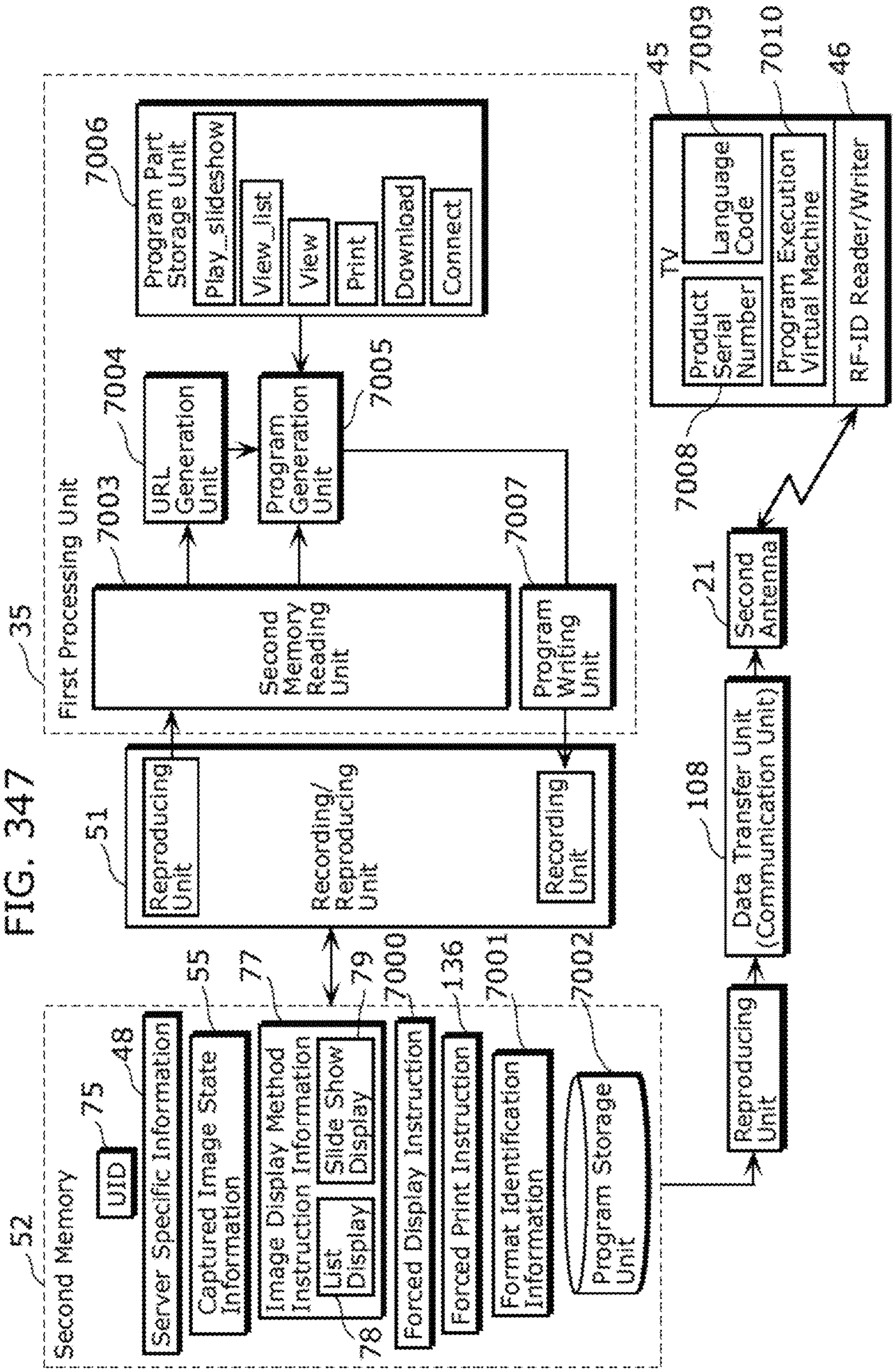

FIG. 347 is a block diagram of (a) a first processing unit generating the operation program in the image capturing device to be executed by the TV, and (b) a second memory unit.

Figure 348:
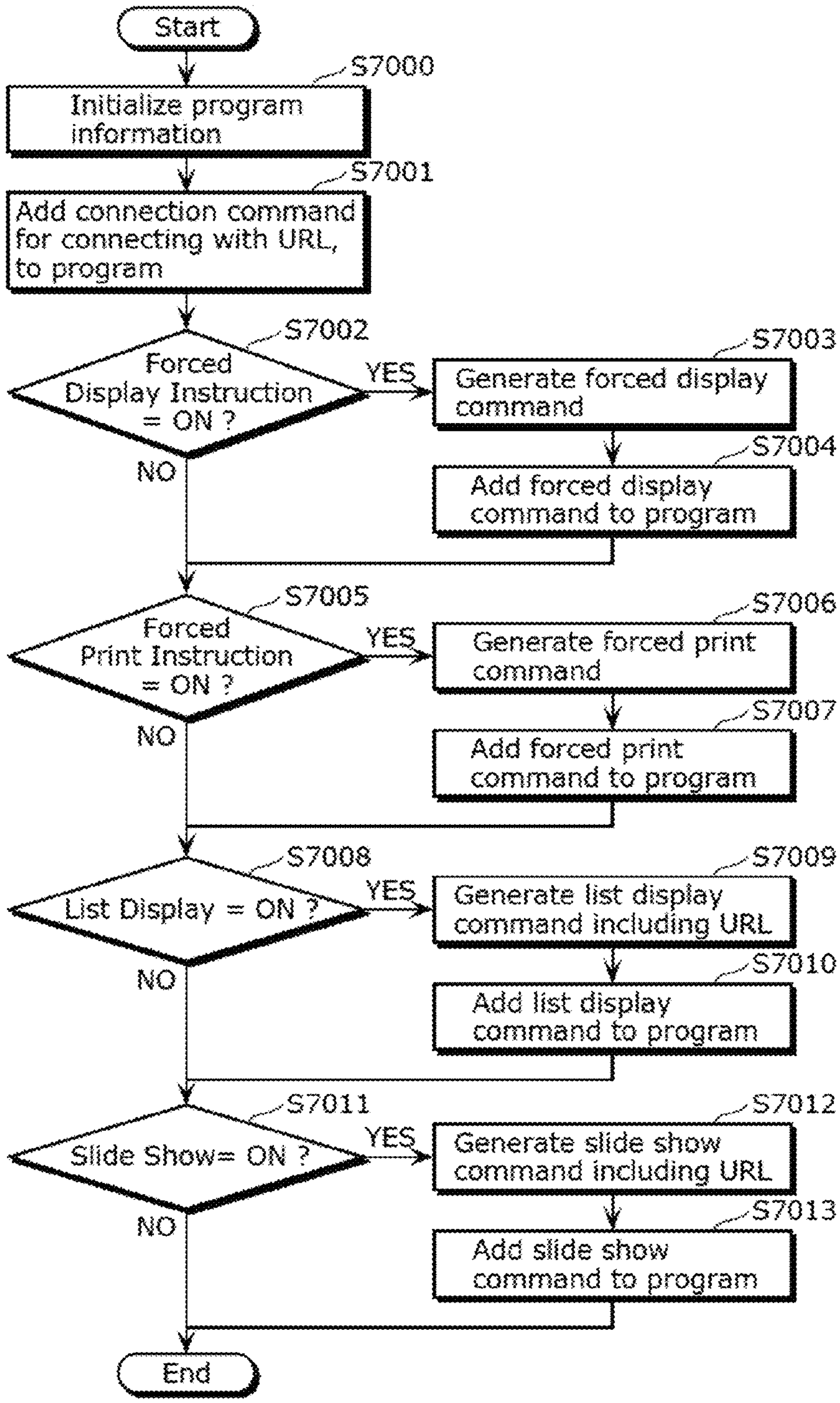

FIG. 348 is a flowchart of processing performed by a program generation unit in the first processing unit.

Figure 349:
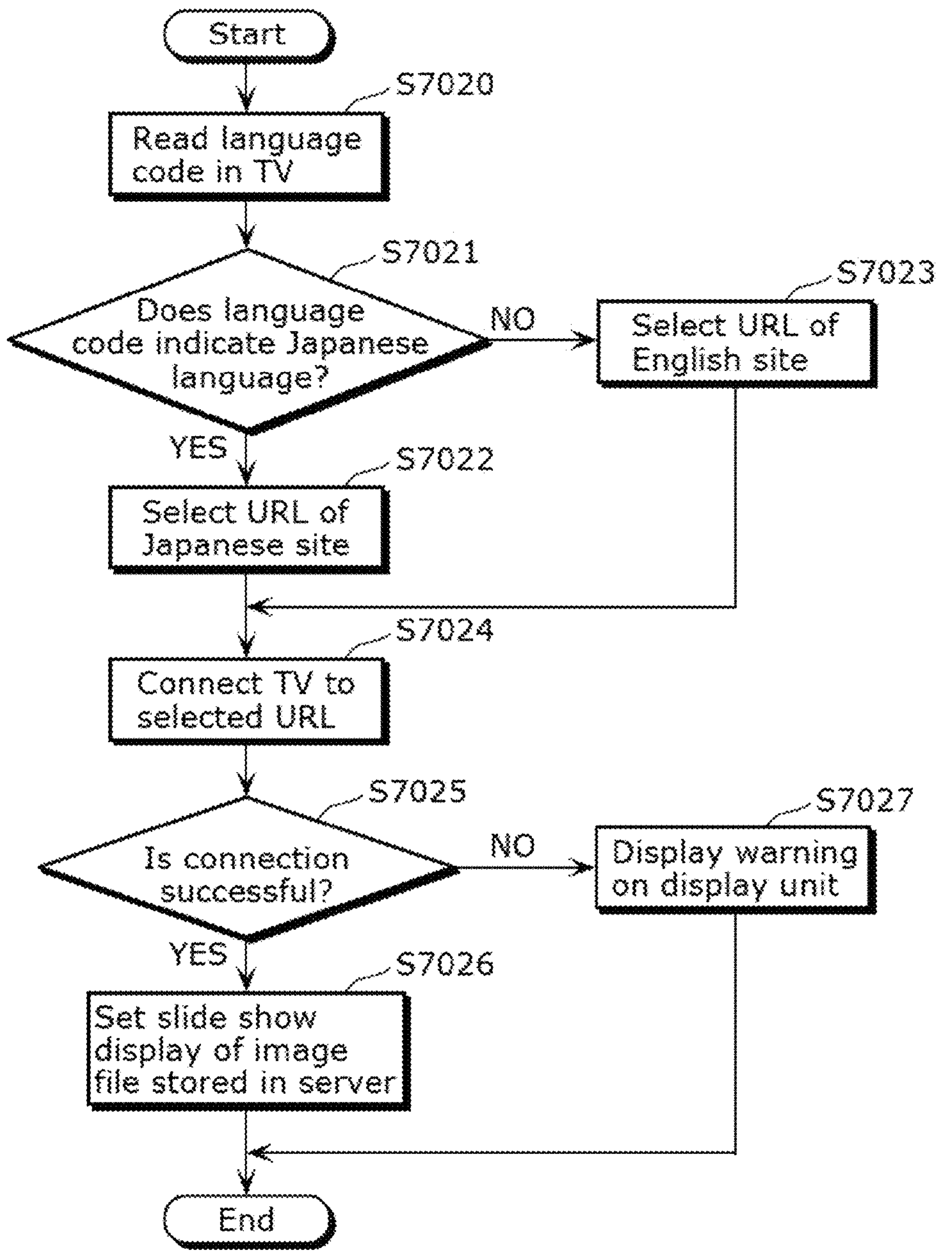

FIG. 349 is a flowchart of an example of a program generated by the program generation unit.

Figure 350:
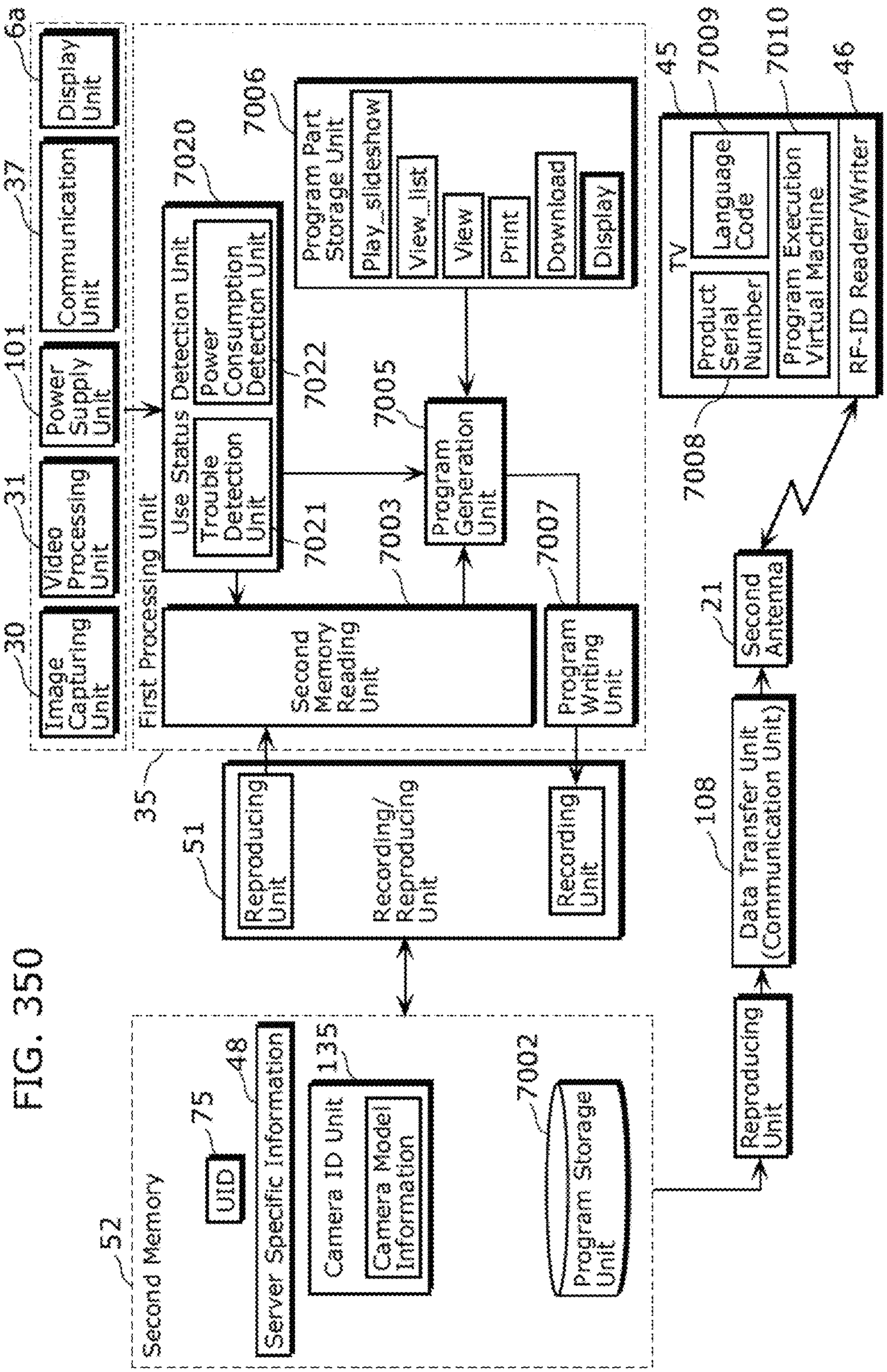

FIG. 350 is a block diagram of (a) the first processing unit generating the operation program in the image capturing device to display a use status of the image capturing device, and (b) the second memory unit.

Figure 351:
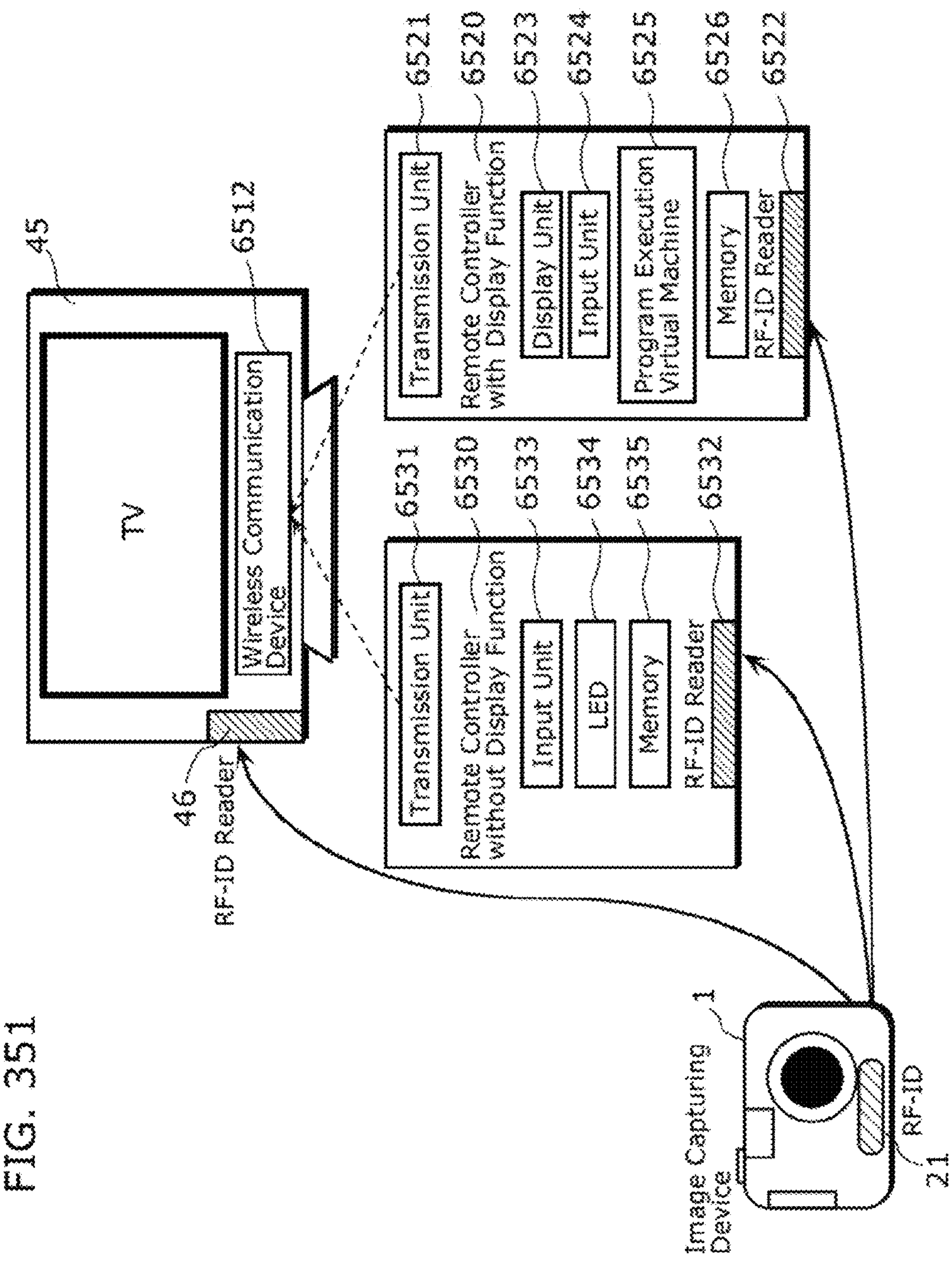

FIG. 351 illustrates a use example where the program generated by the image capturing device is executed by an external device (apparatus).

Figure 352:
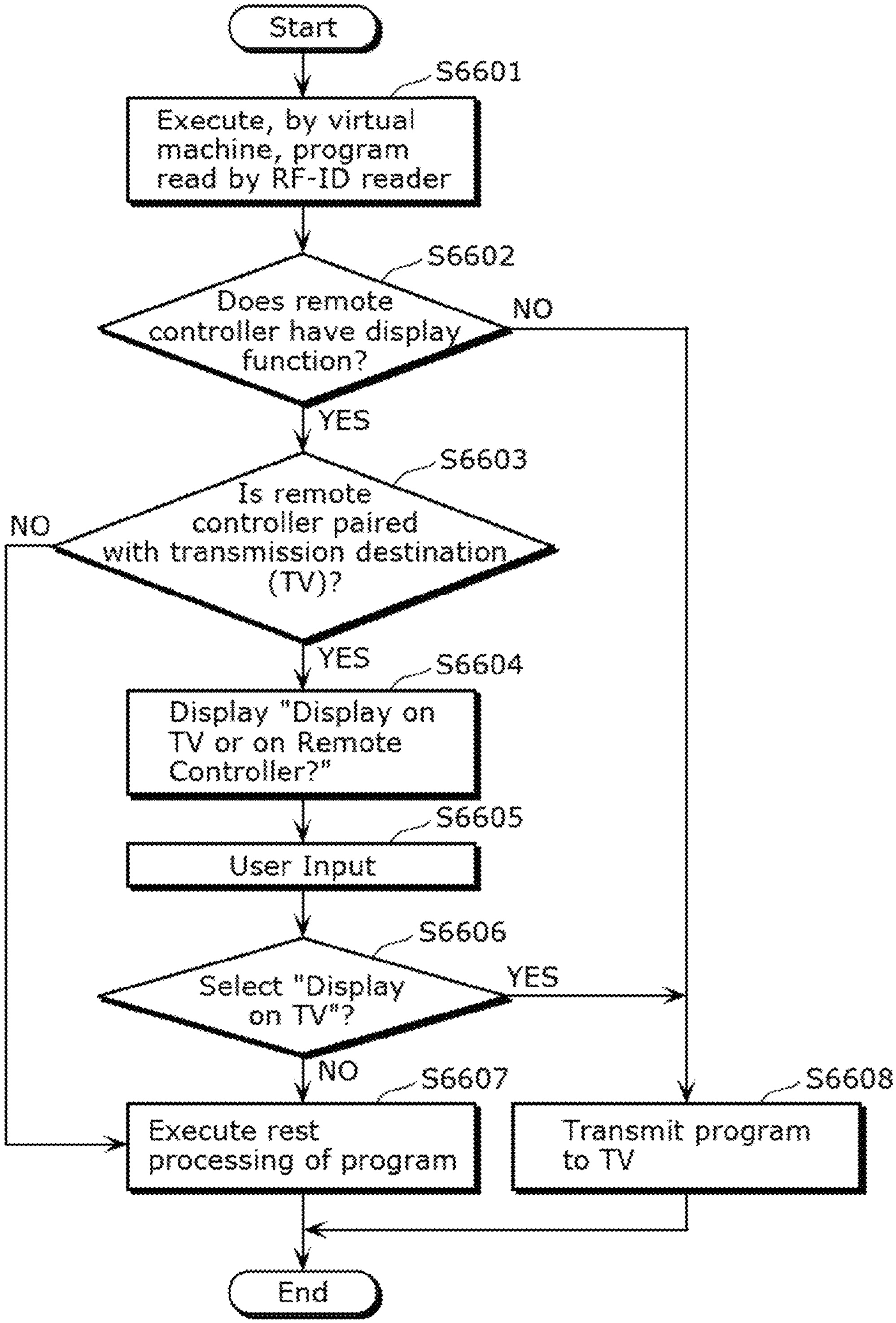

FIG. 352 is a sequence where the program generated by the image capturing device is executed by a remote controller with display function.

Figure 353A:
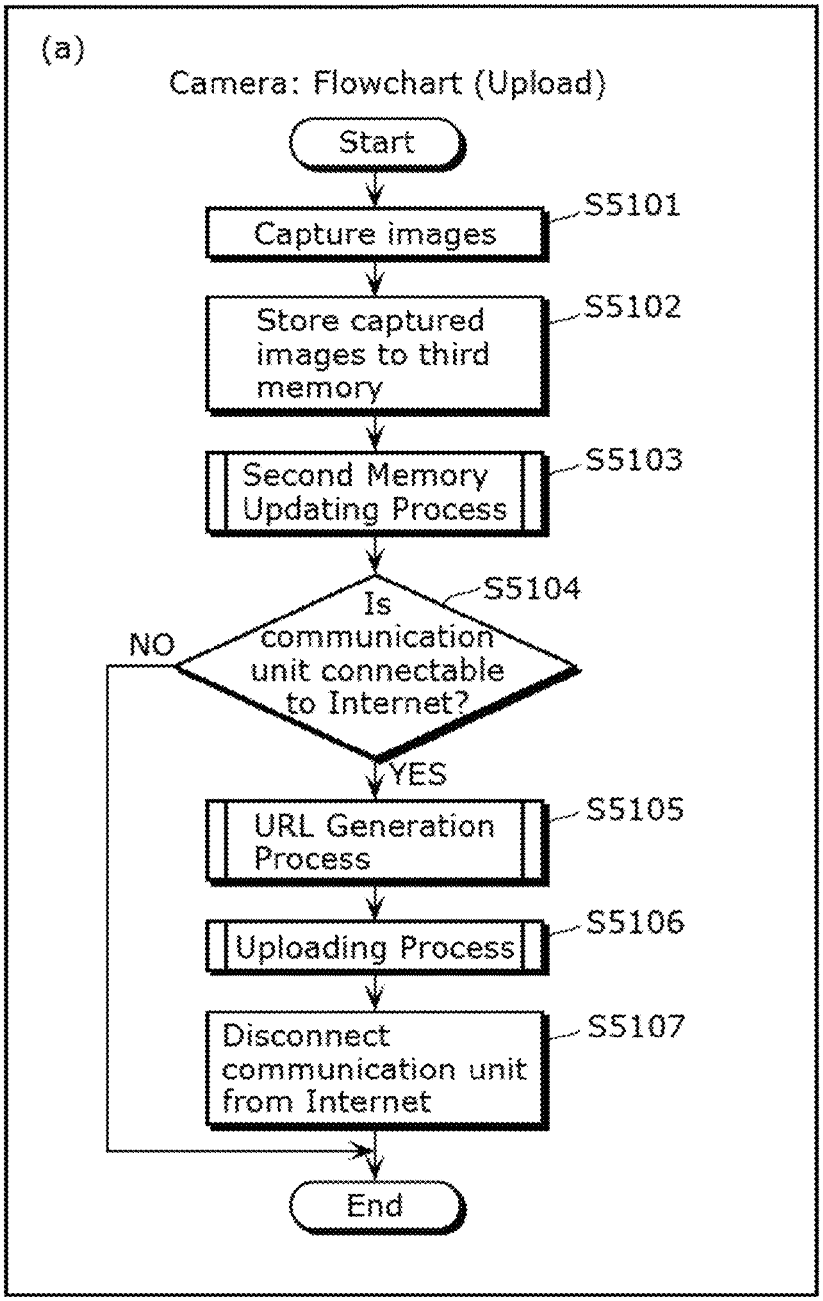

FIG. 353A is a flowchart of uploading steps in a camera according to Embodiment A2.

Figure 353B:
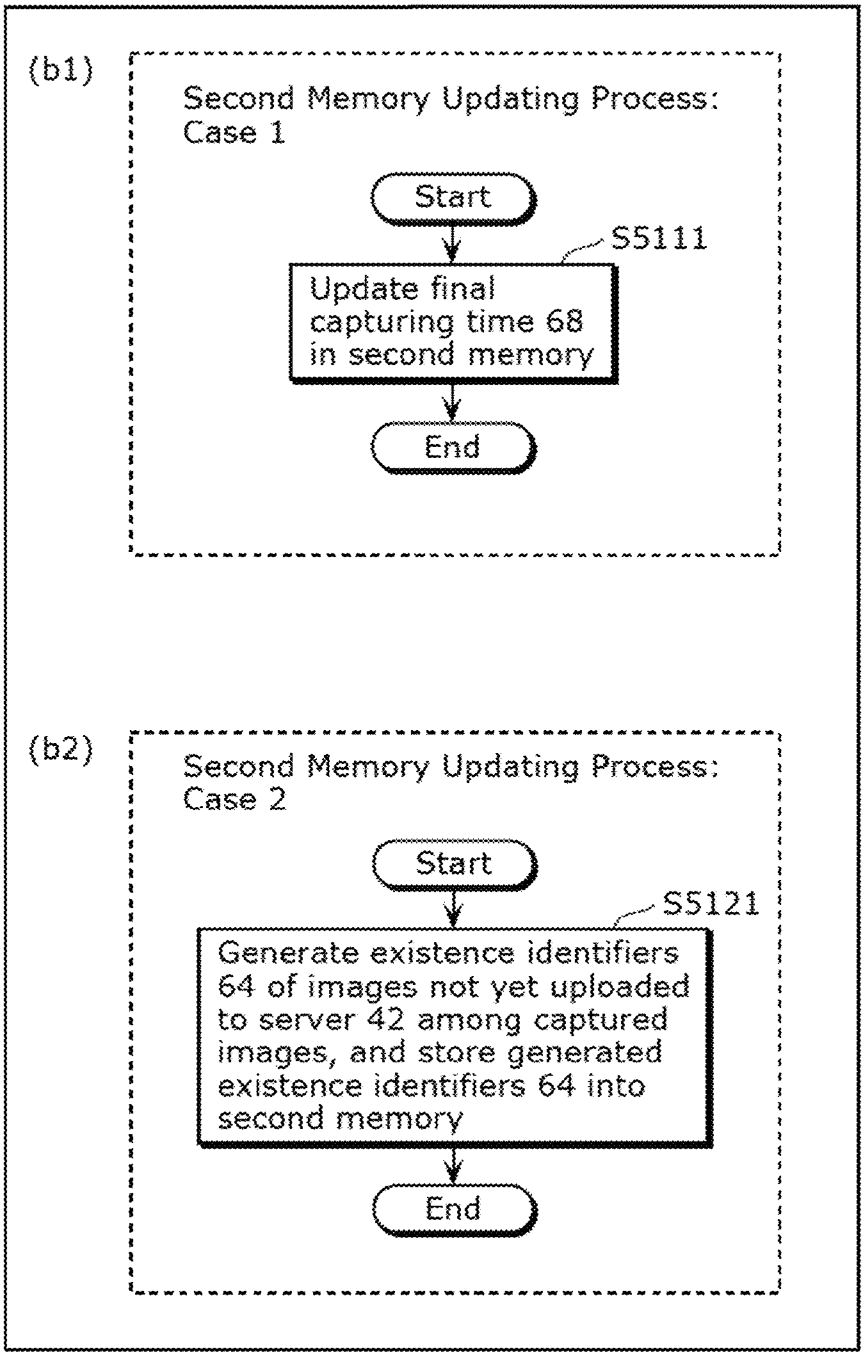

FIG. 353B is a flowchart of uploading steps in the camera according to Embodiment A2.

Figure 353C:
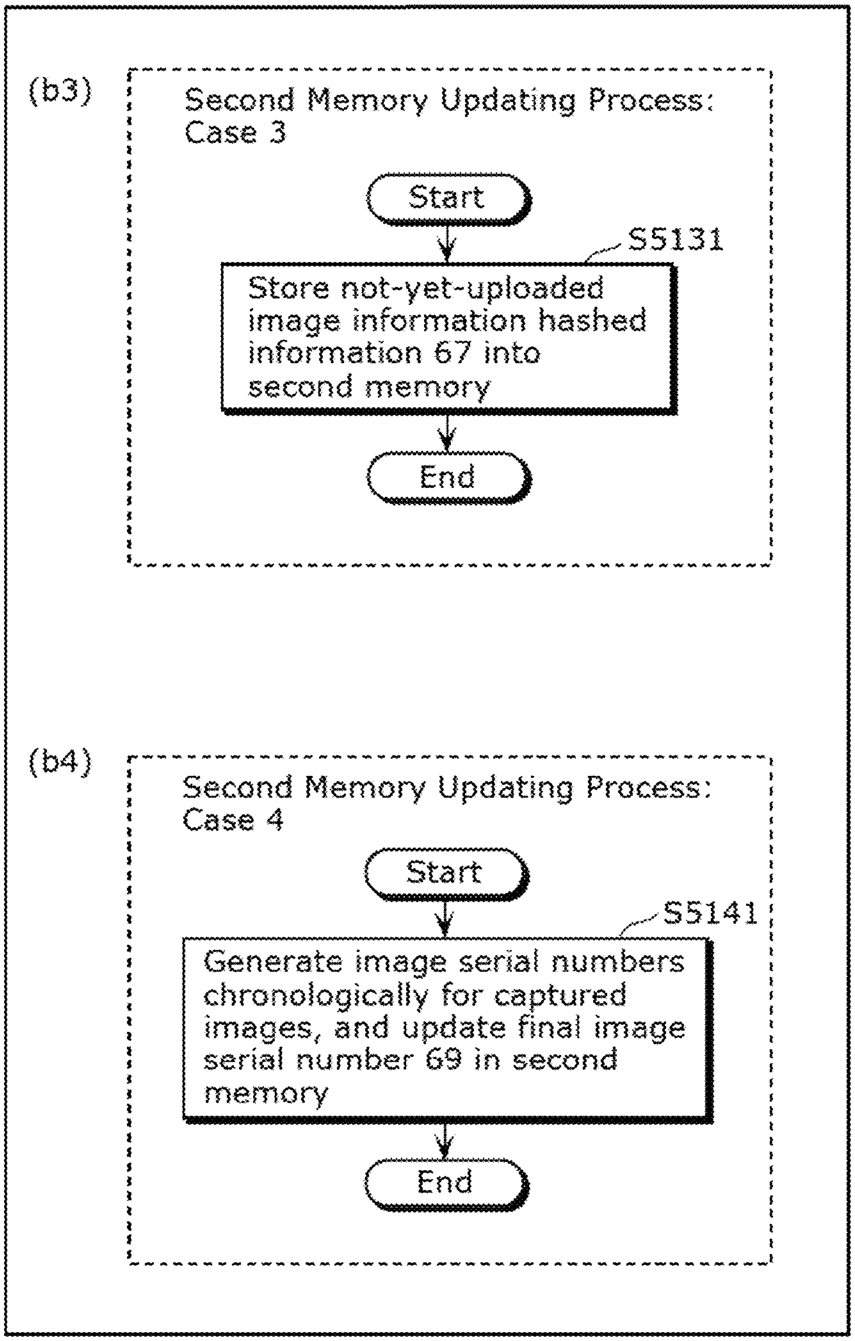

FIG. 353C is a flowchart of uploading steps in the camera according to Embodiment A2.

Figure 354:
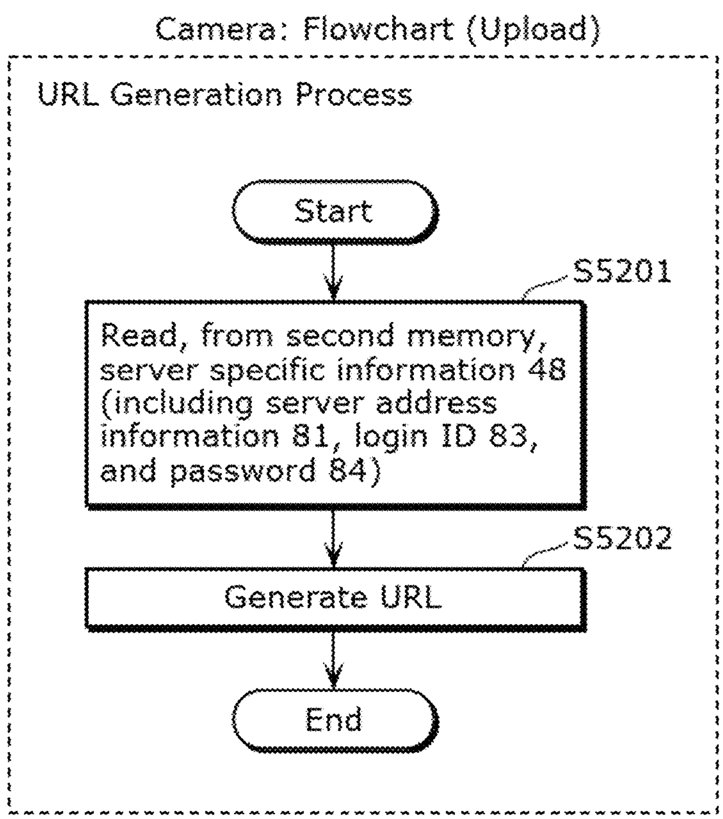

FIG. 354 is a flowchart of uploading steps in the camera according to Embodiment A2.

Figure 355A:
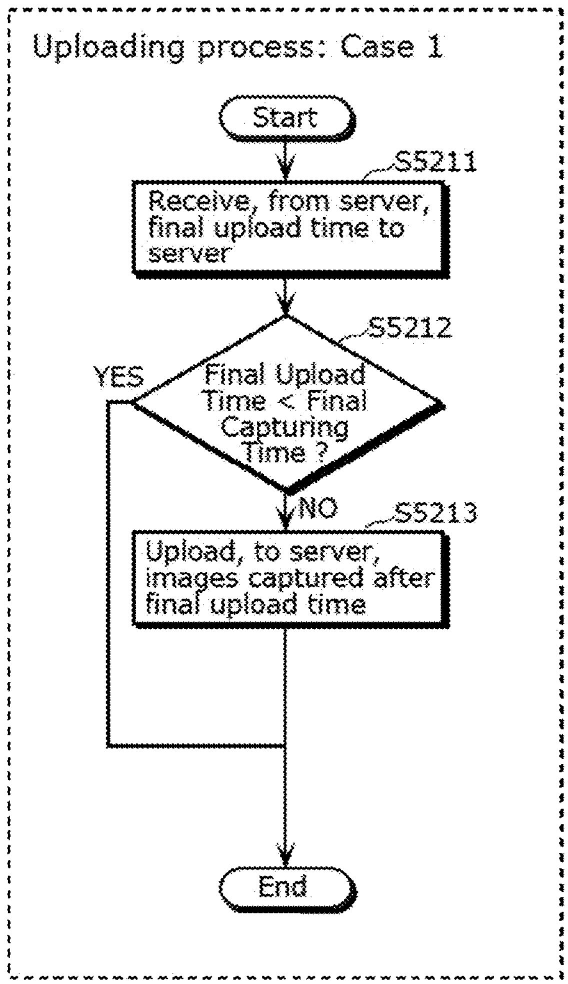

FIG. 355A is a flowchart of uploading steps in the camera according to Embodiment A1.

Figure 355B:
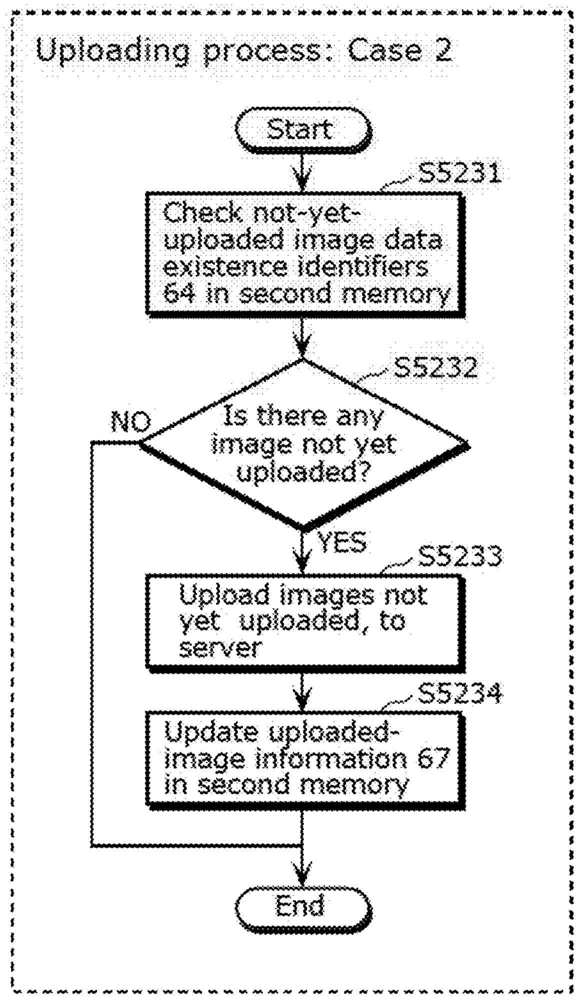

FIG. 355B is a flowchart of uploading steps in the camera according to Embodiment A1.

Figure 355C:
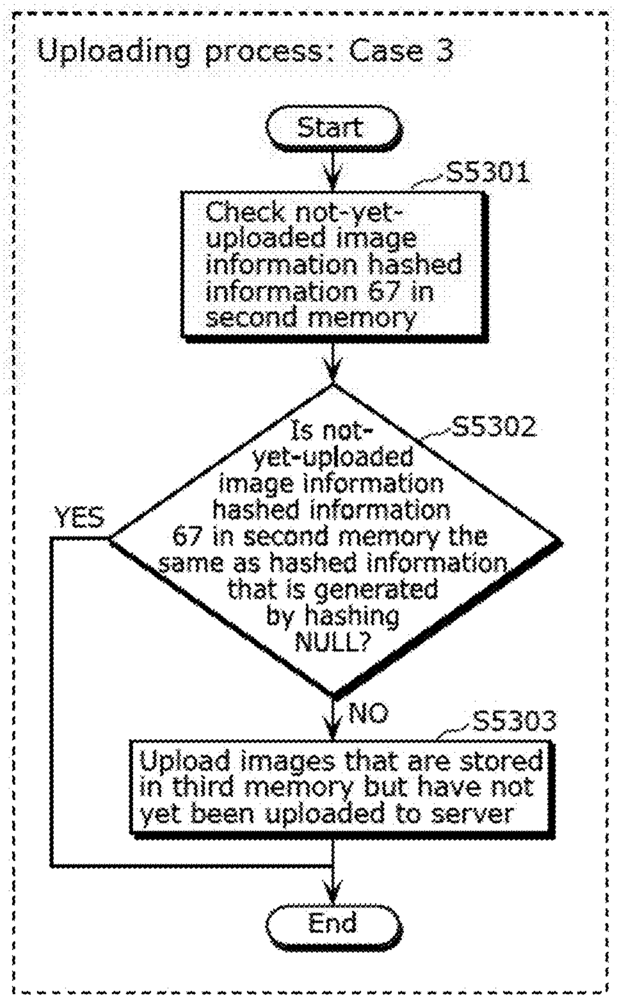

FIG. 355C is a flowchart of uploading steps in the camera according to Embodiment A1.

Figure 355D:
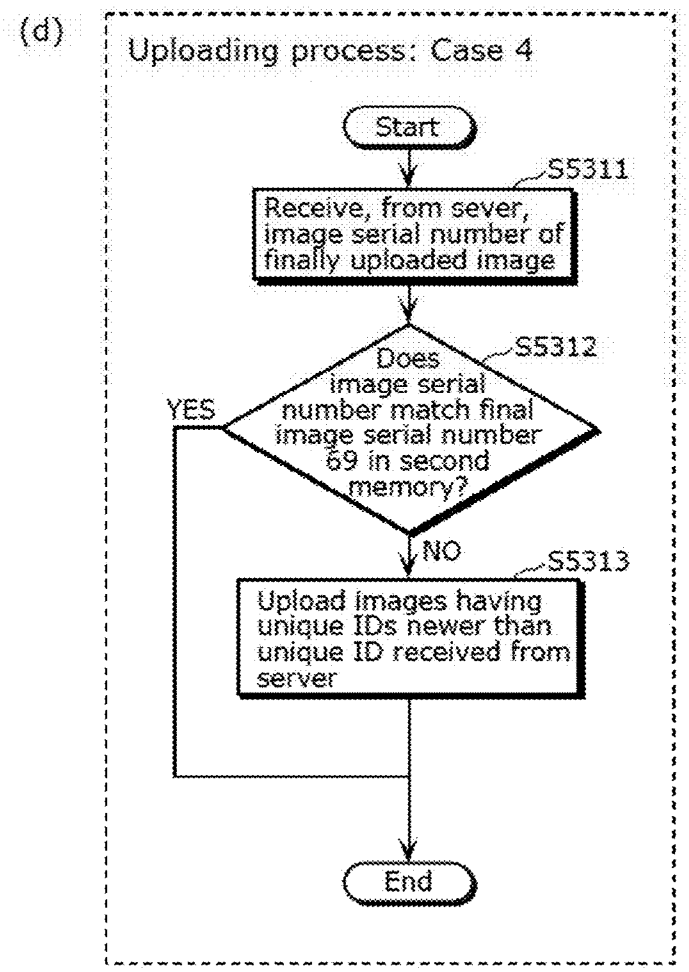

FIG. 355D is a flowchart of uploading steps in the camera according to Embodiment A1.

Figure 356:
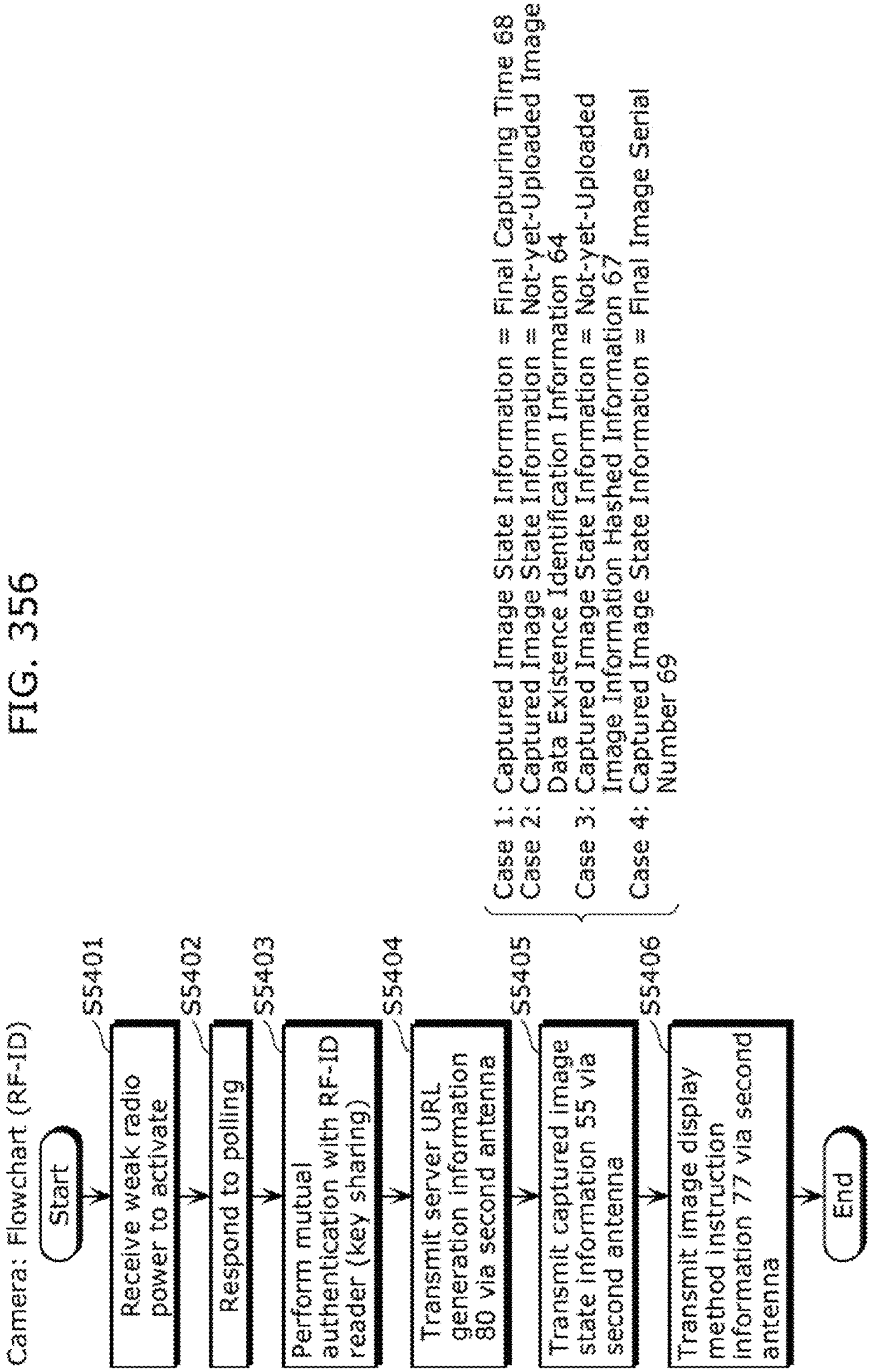

FIG. 356 is a flowchart of operation steps of a RF-ID unit in the camera according to Embodiment A2.

Figure 357:
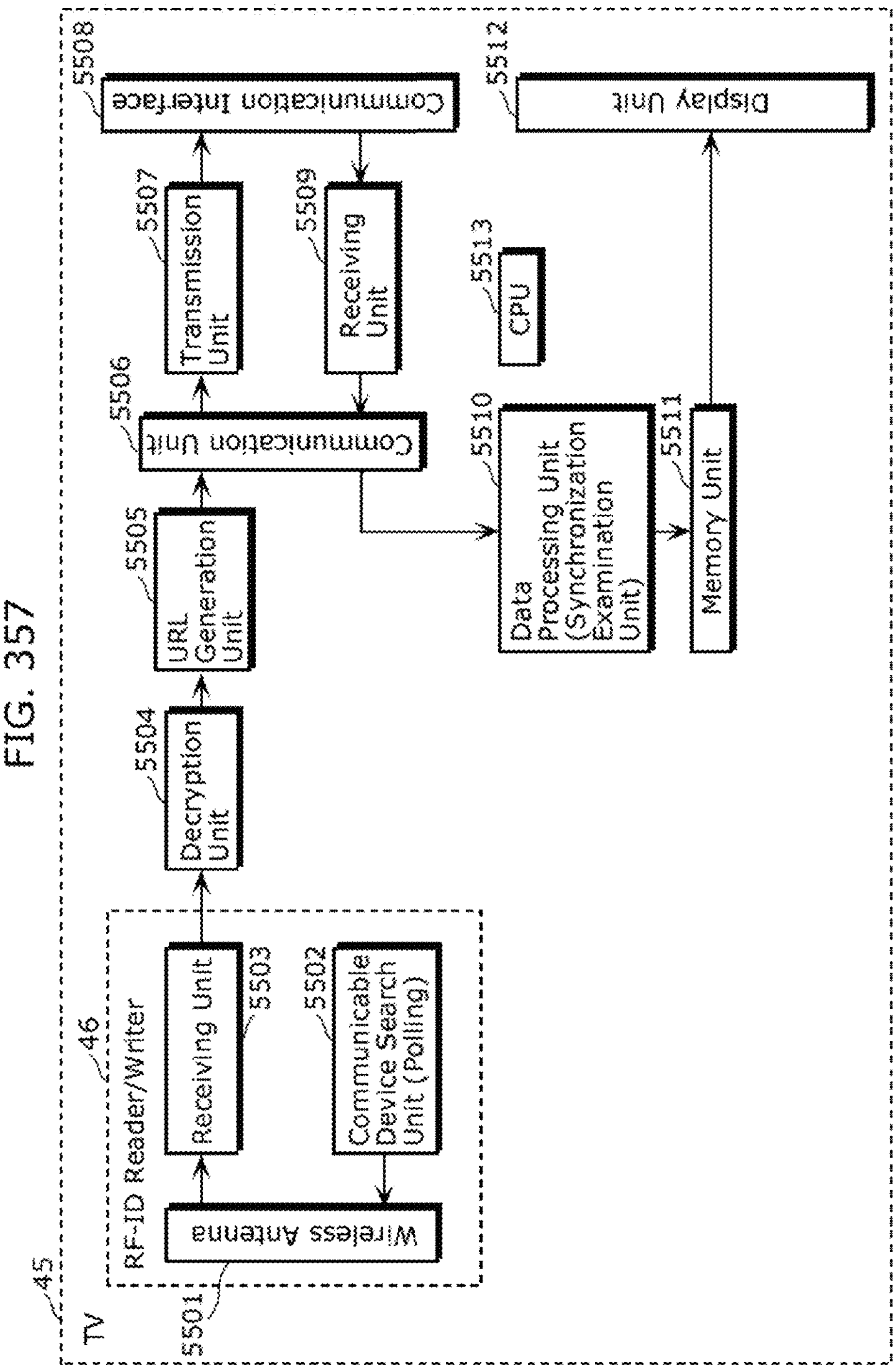

FIG. 357 is a block diagram of a TV according to Embodiment A2.

Figure 358:
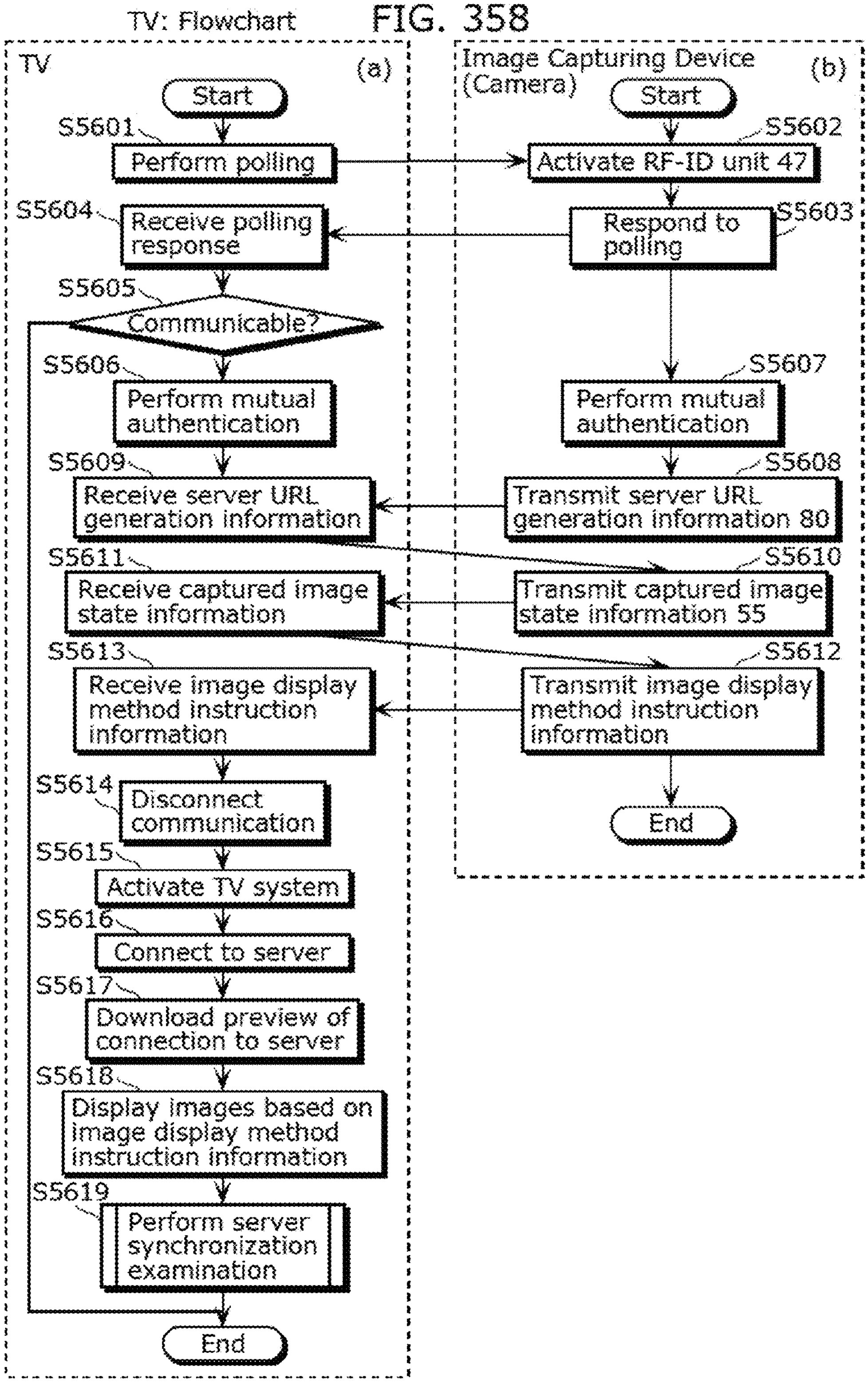

FIG. 358 is a flowchart of RF-ID communication between the camera and the TV, according to Embodiment A2.

Figure 359A:
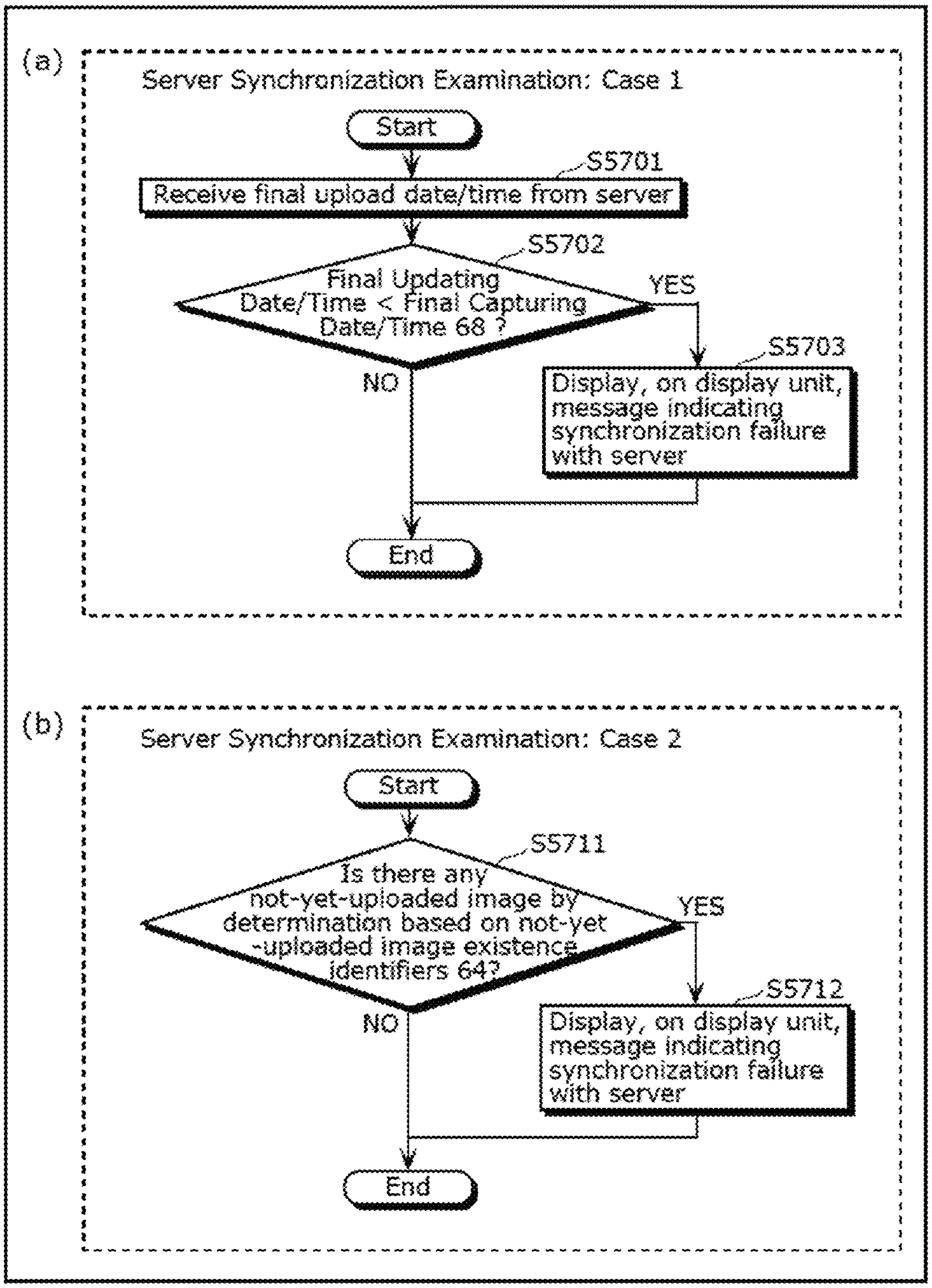

FIG. 359A is a flowchart presenting details of FIG. 358.

Figure 359B:
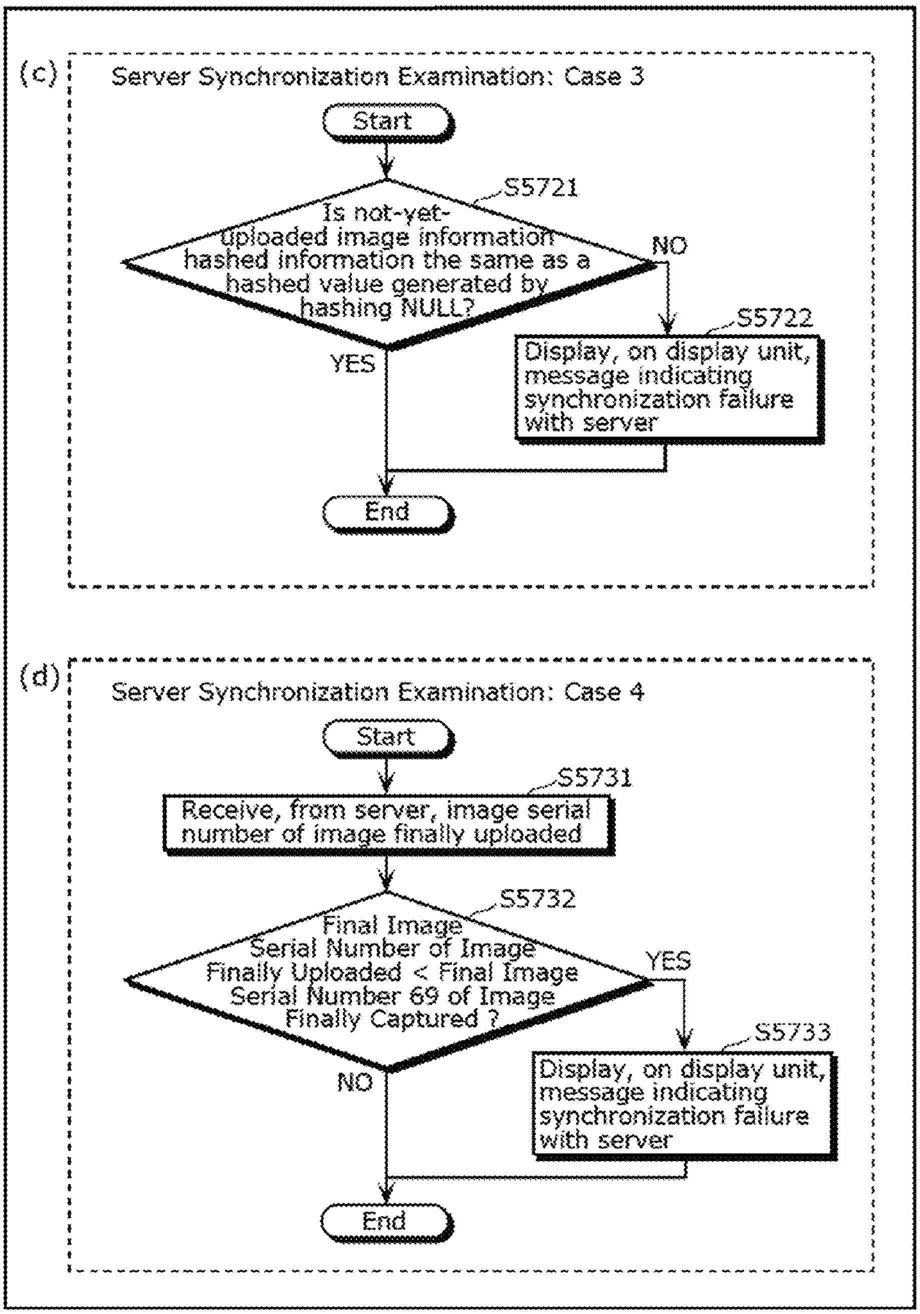

FIG. 359B is a flowchart presenting details of FIG. 358.

FIG. 360 presents a data format of the RF-ID communication between the camera and the TV.

Figure 361:
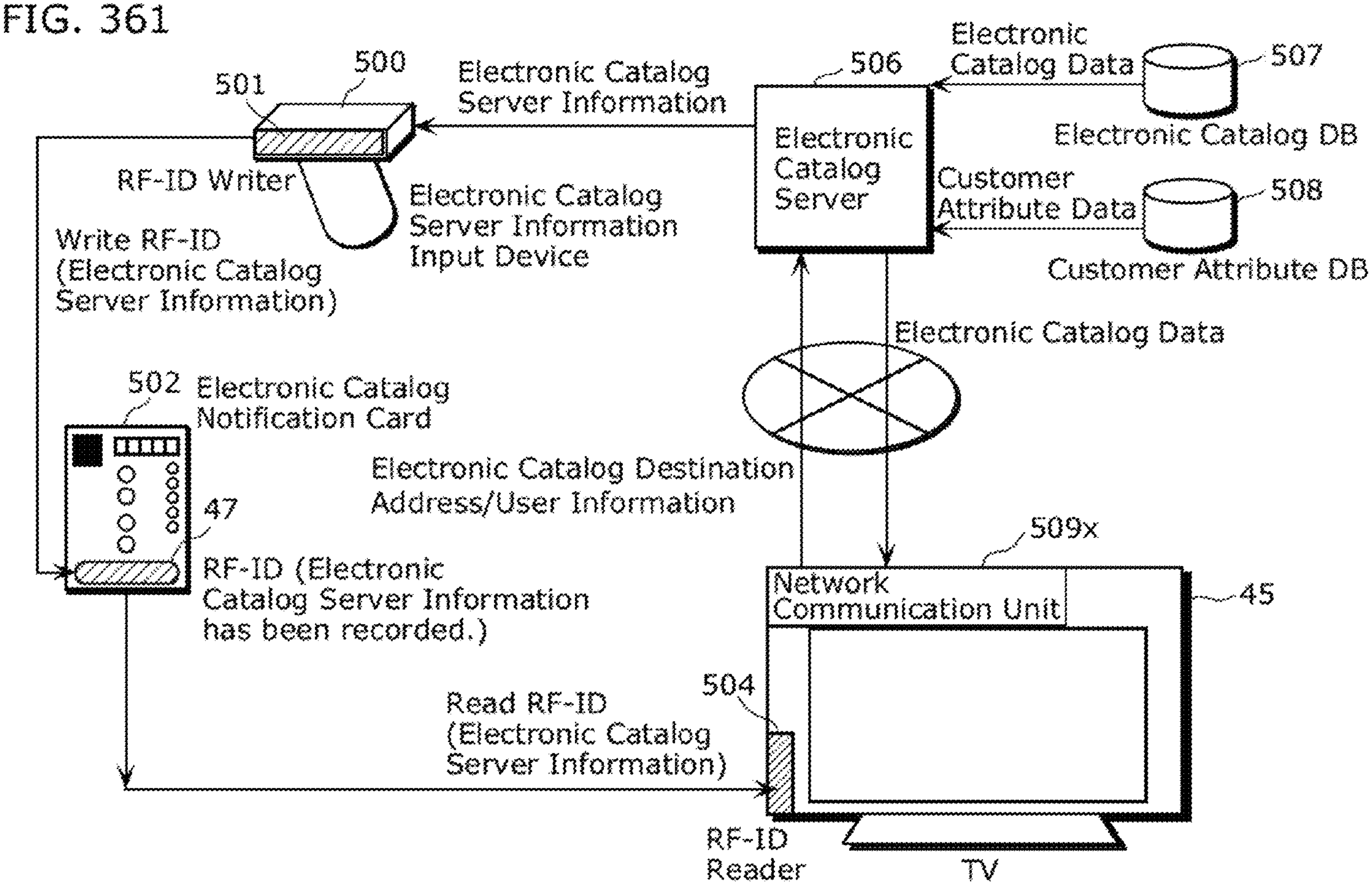

FIG. 361 is a schematic diagram of an electronic catalog display system.

Figure 362:
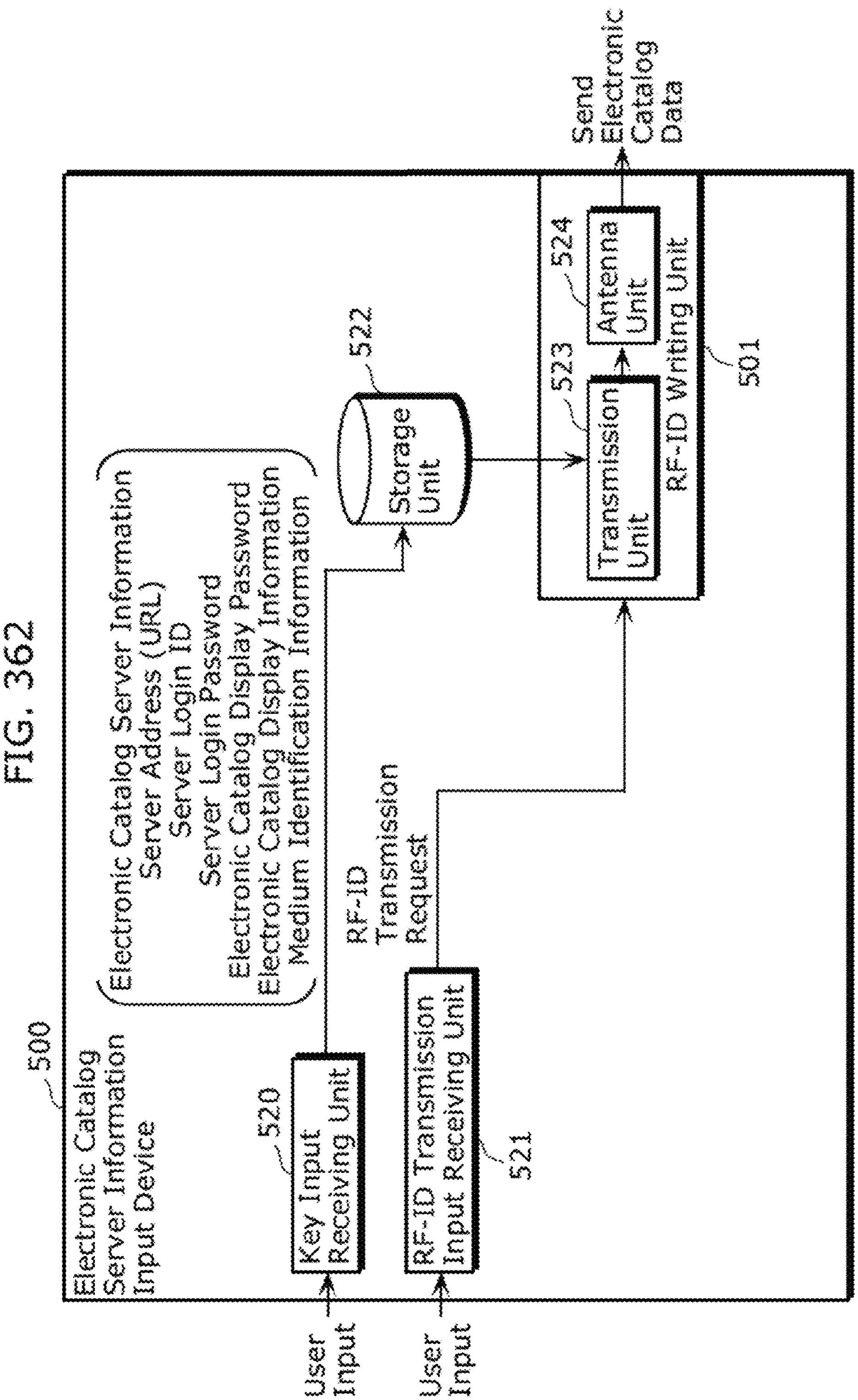

FIG. 362 is a block diagram of an electronic catalog server information input device.

Figure 363:
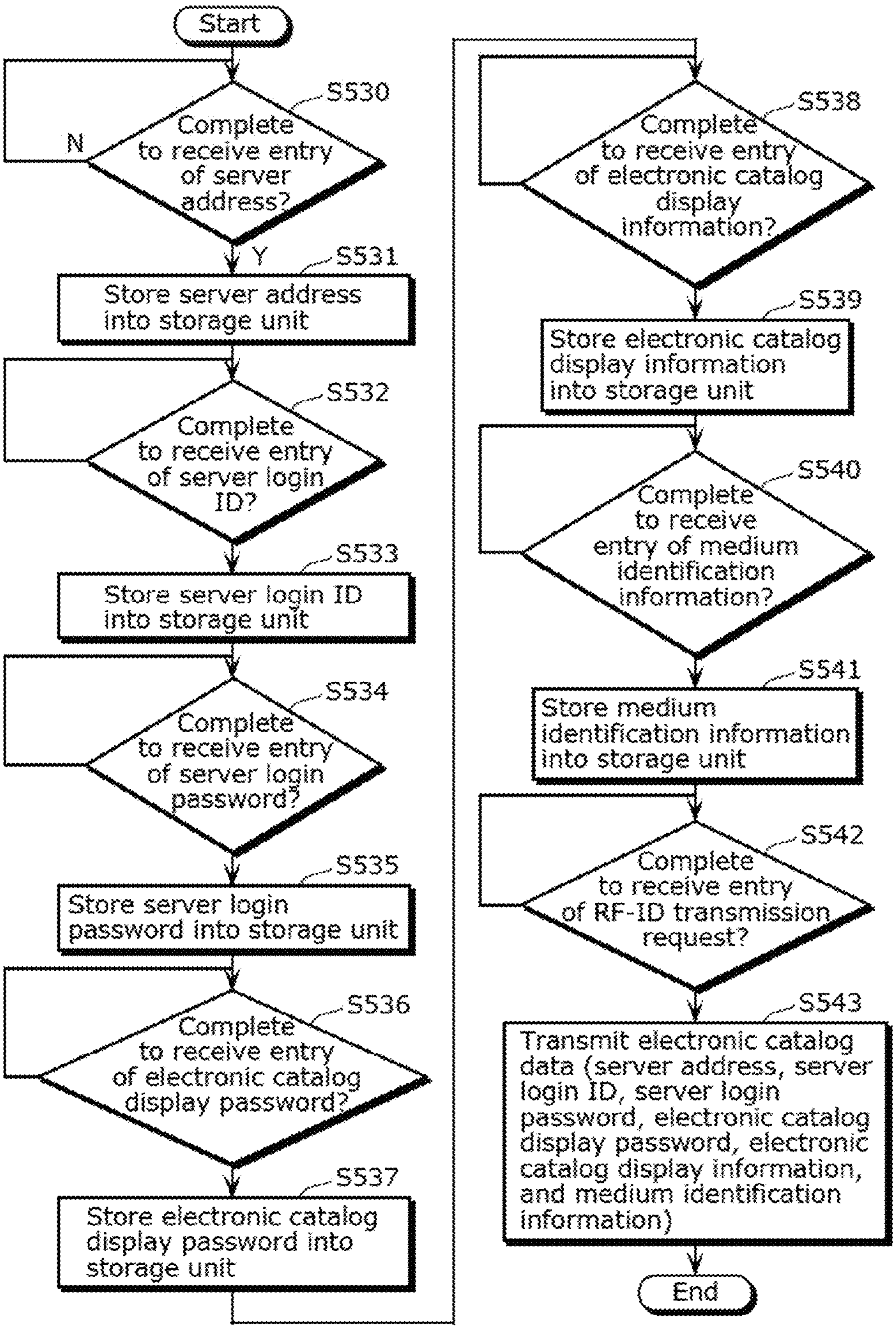

FIG. 363 is a flowchart of steps of processing performed by the electronic catalog server information input device.

Figure 364:
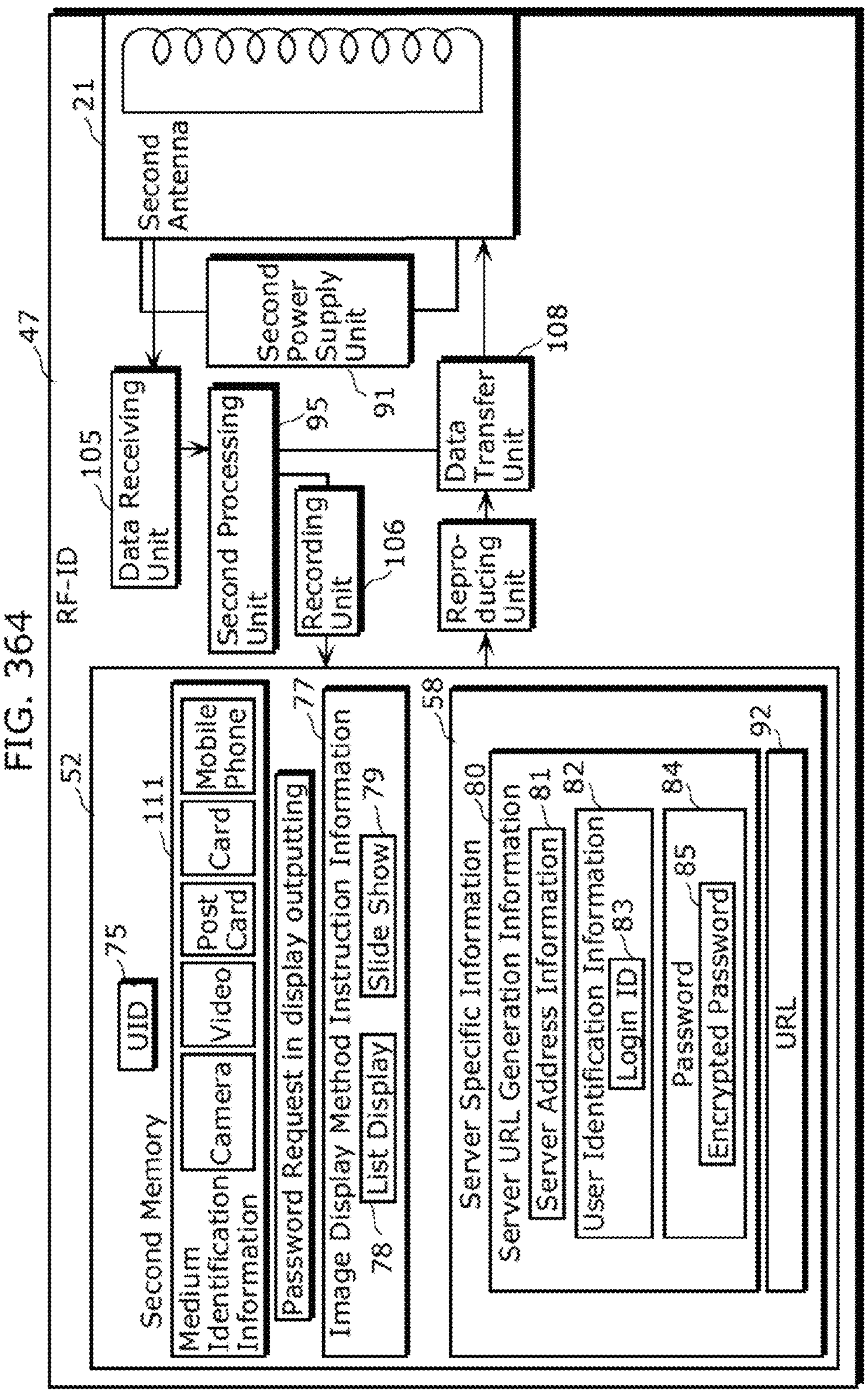

FIG. 364 is a block diagram of a RF-ID unit of an electronic catalog notification card.

Figure 365:
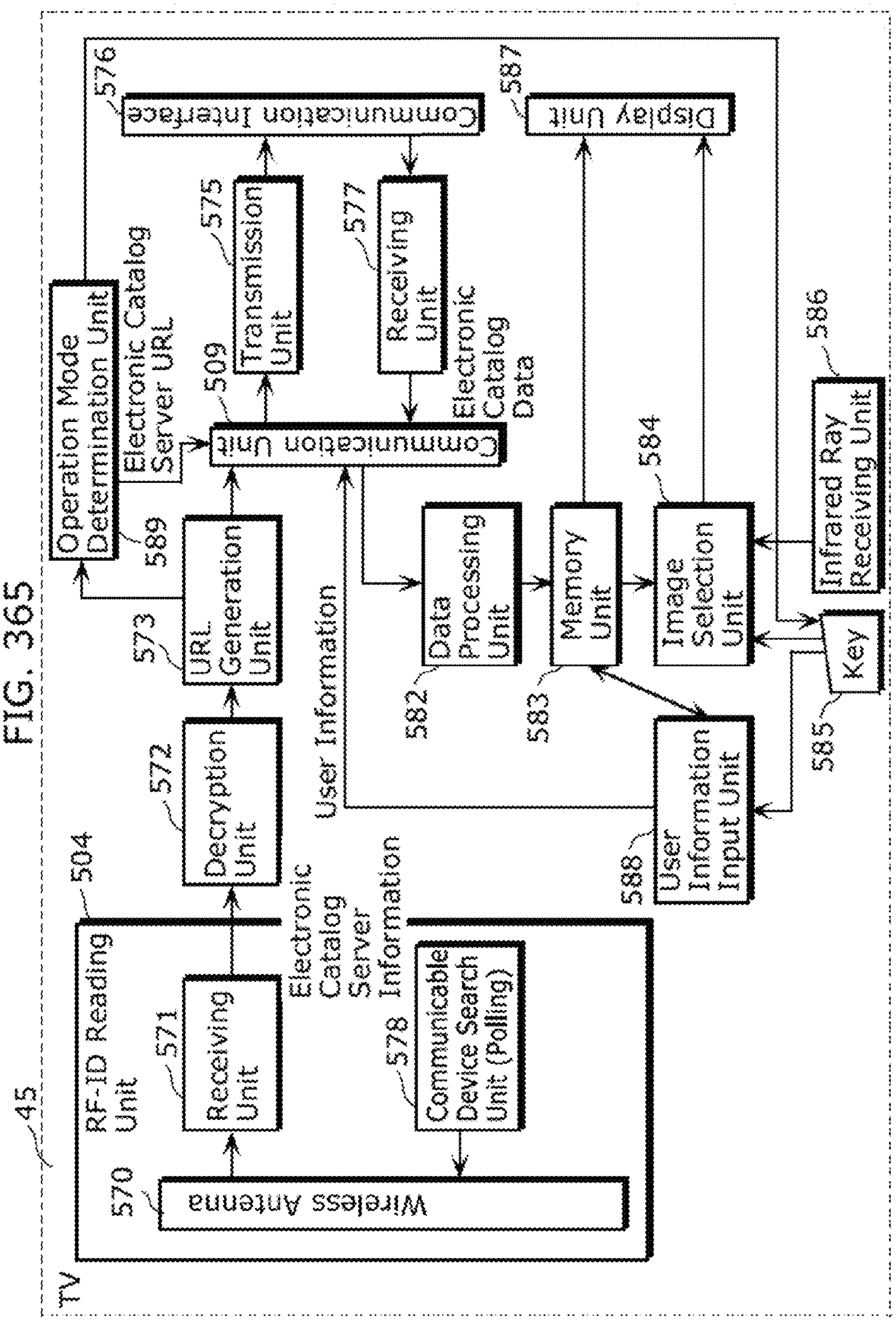

FIG. 365 is a block diagram of a TV displaying an electronic catalog.

Figure 366:
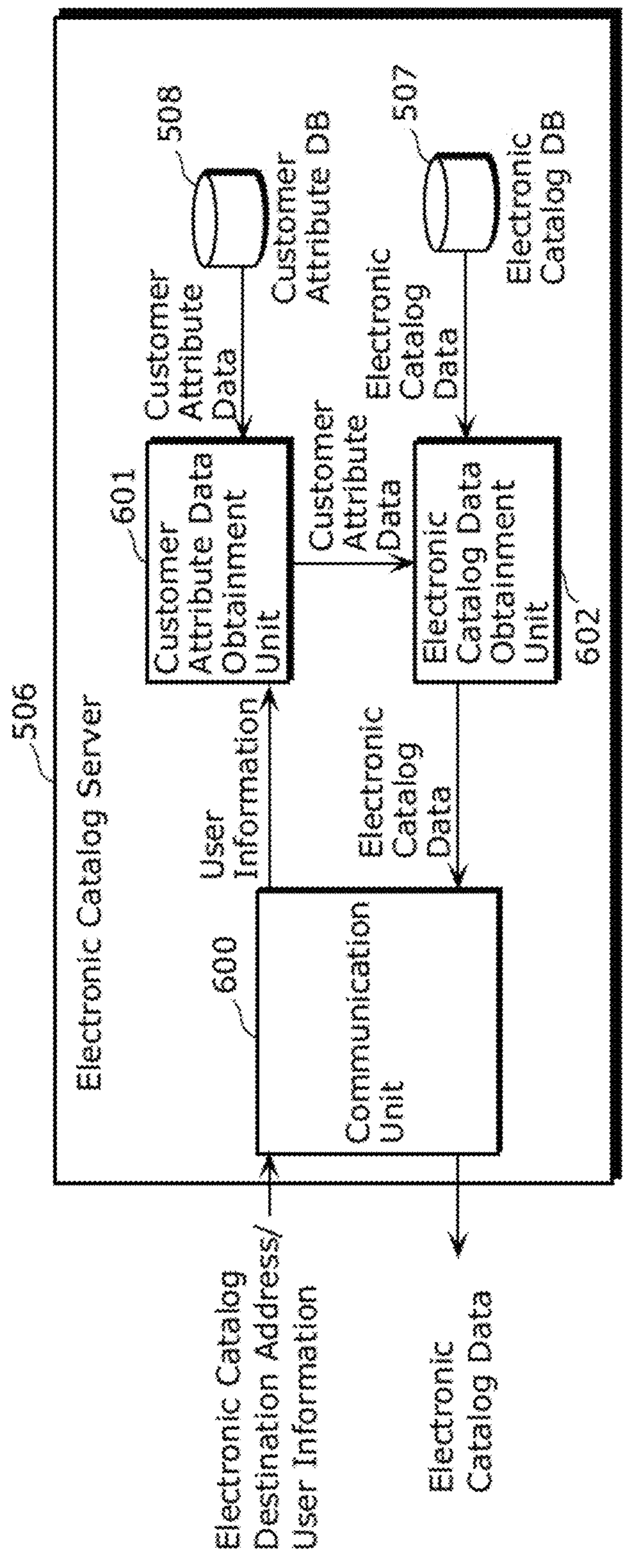

FIG. 366 is a block diagram of an electronic catalog server.

Figure 367:
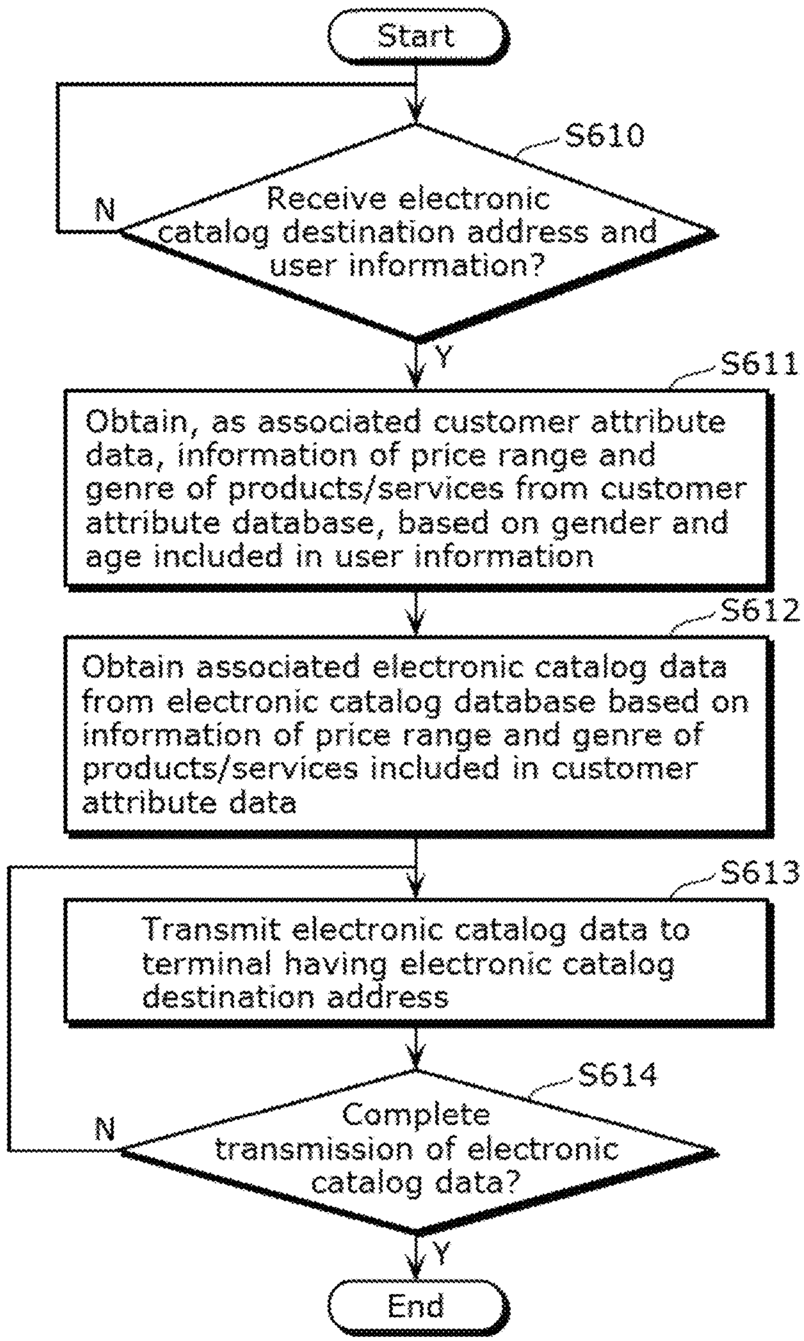

FIG. 367 is a flowchart of steps of processing performed by the electronic catalog server.

Figure 368:
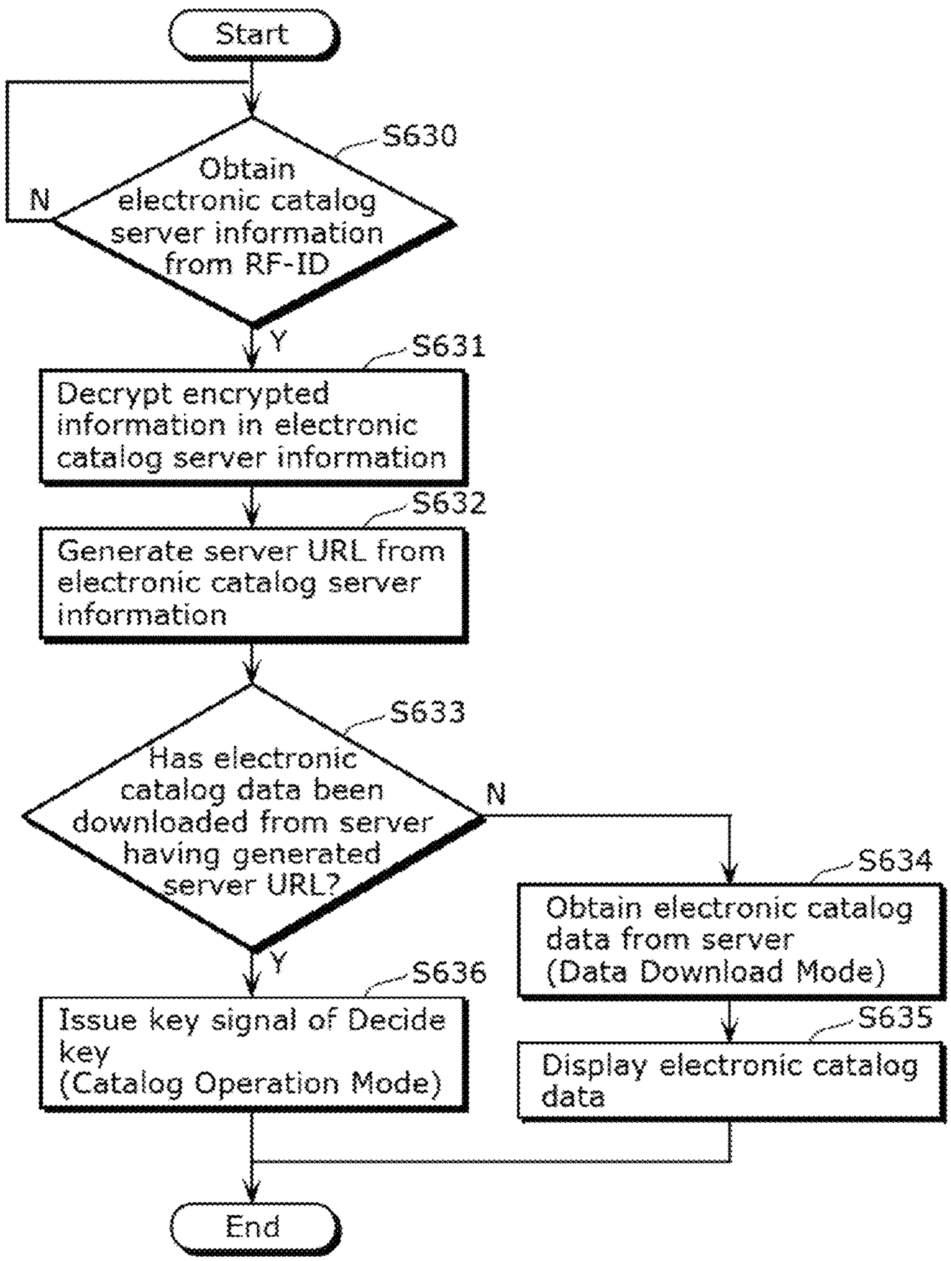

FIG. 368 is a flowchart of steps of processing performed by a TV displaying the electronic catalog.

Figure 369:
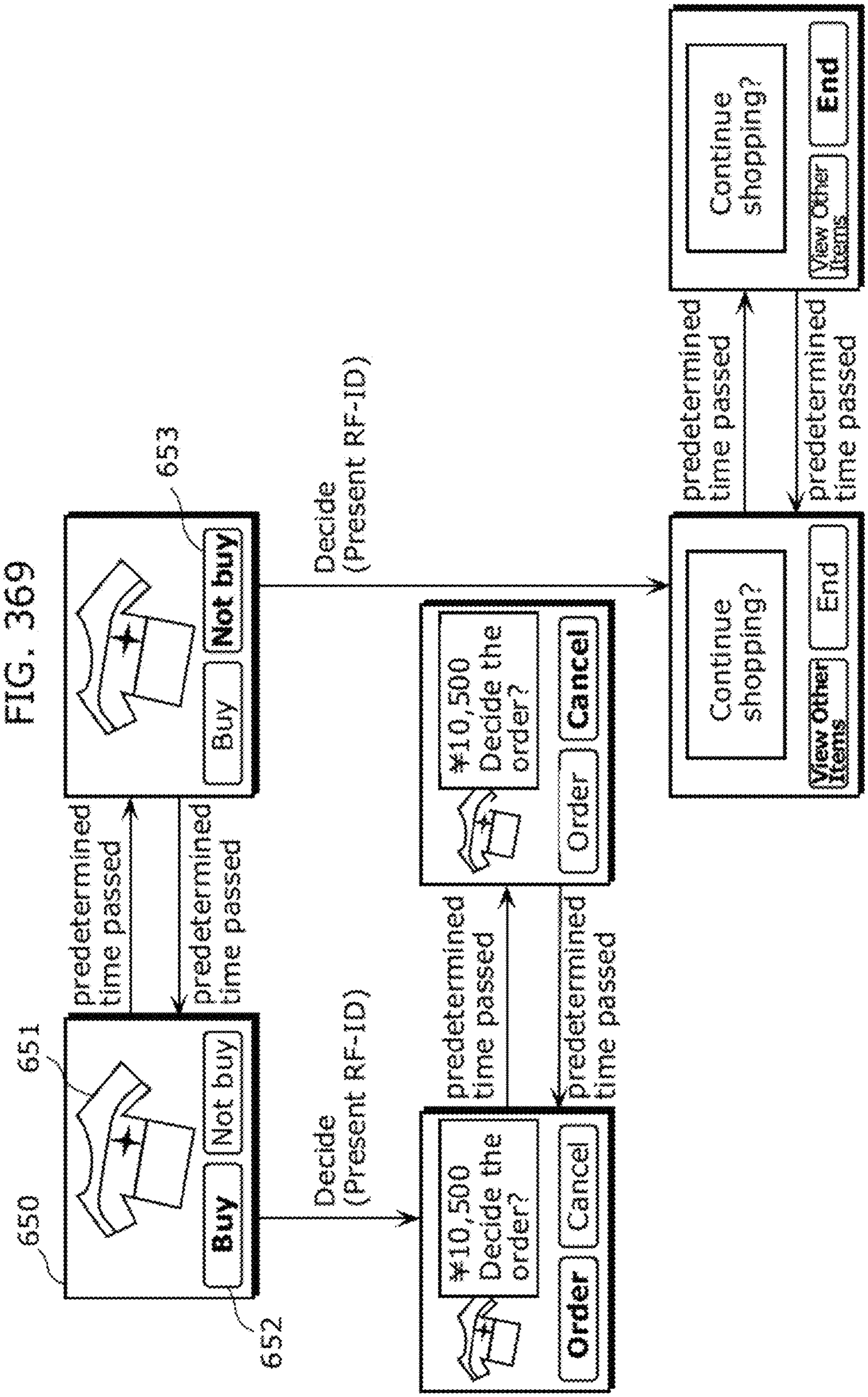

FIG. 369 is a diagram illustrating screen display of the electronic catalog.

FIG. 370 is a table of a data structure of a customer attribute database.

FIG. 371 is a table of a data structure of an electronic catalog database.

Figure 372:
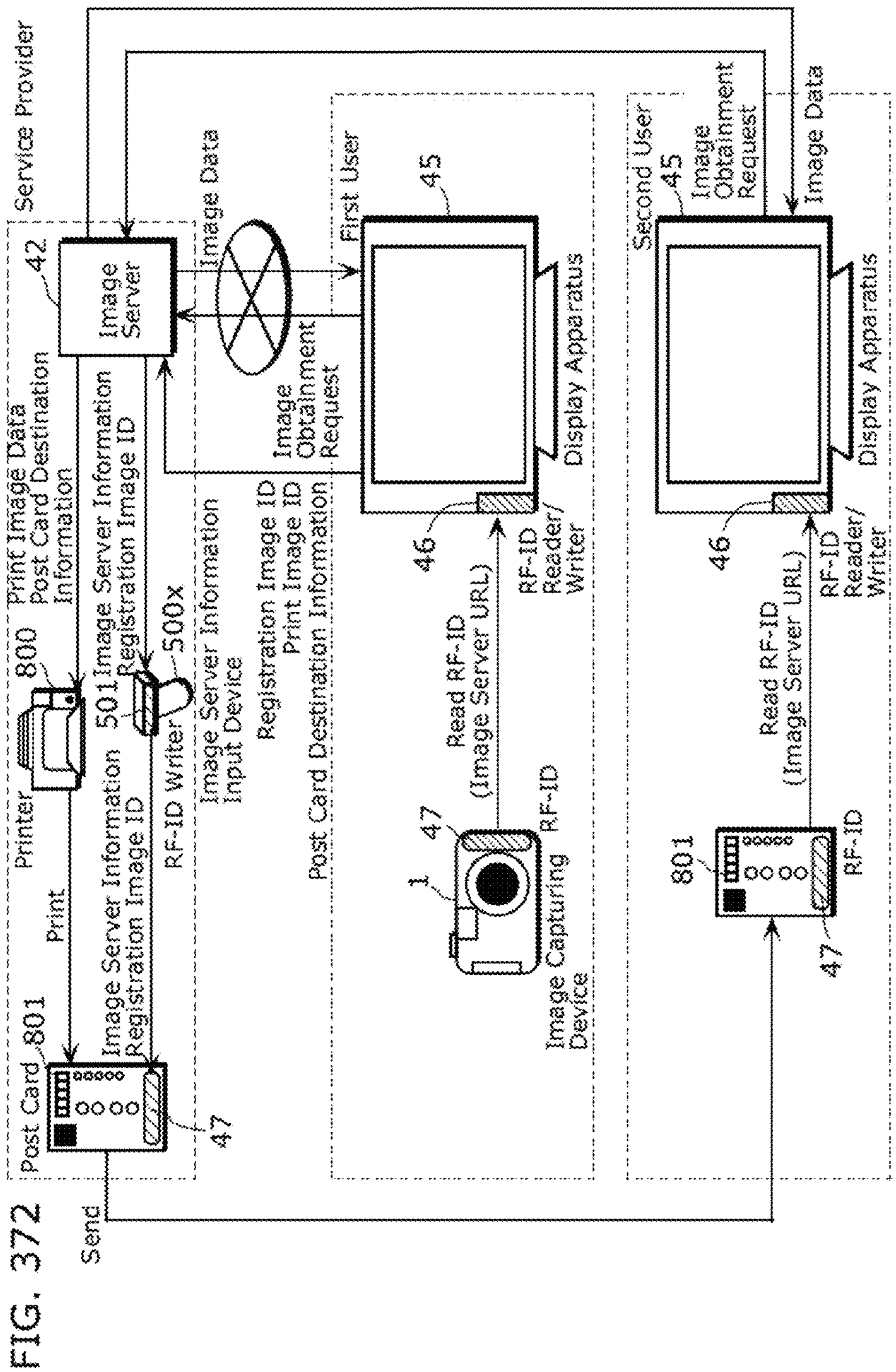

FIG. 372 is a schematic diagram of a RF-ID-attached post card mailing system.

Figure 373:
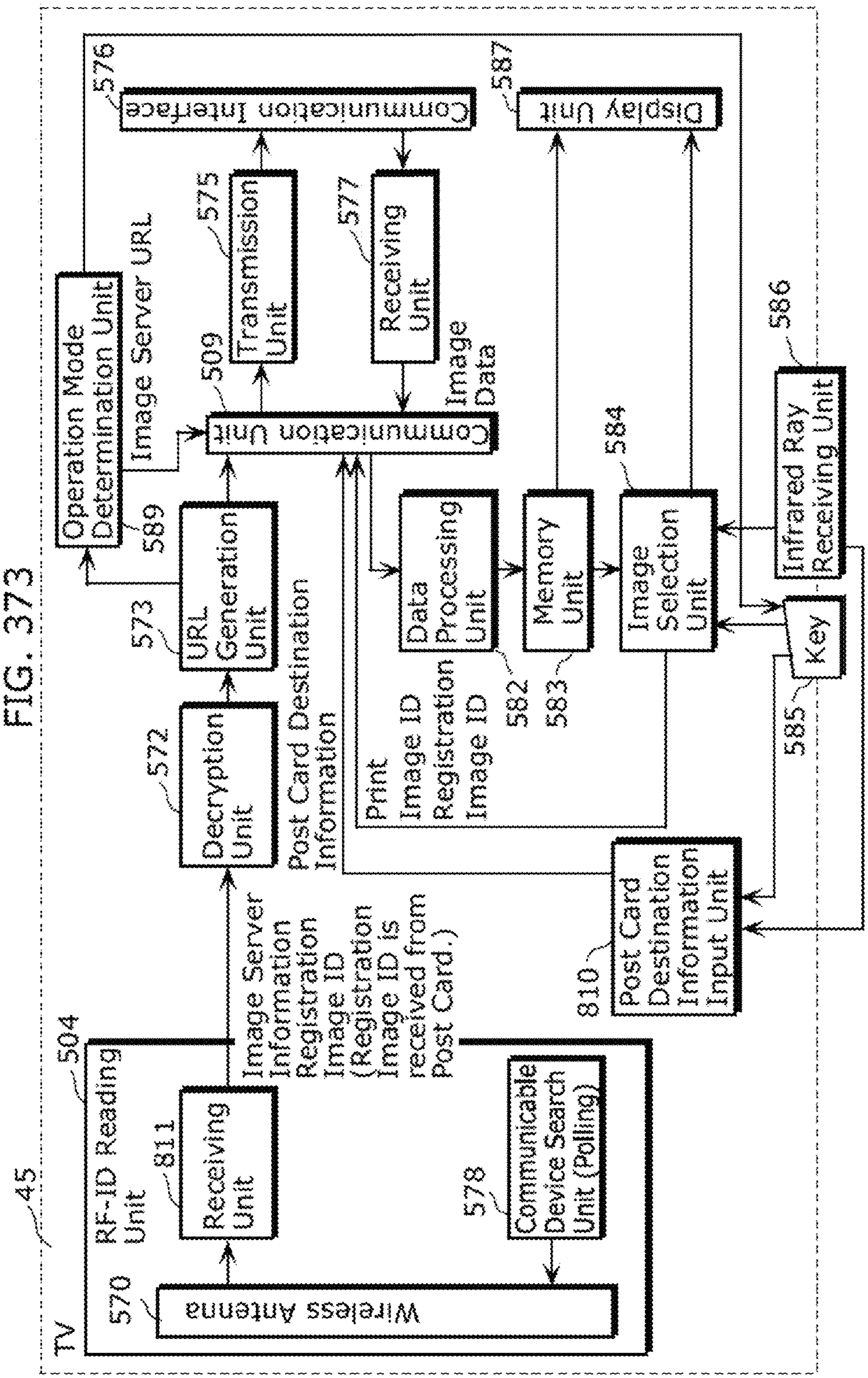

FIG. 373 is a block diagram of a TV in the RF-ID-attached post card mailing system.

Figure 374:
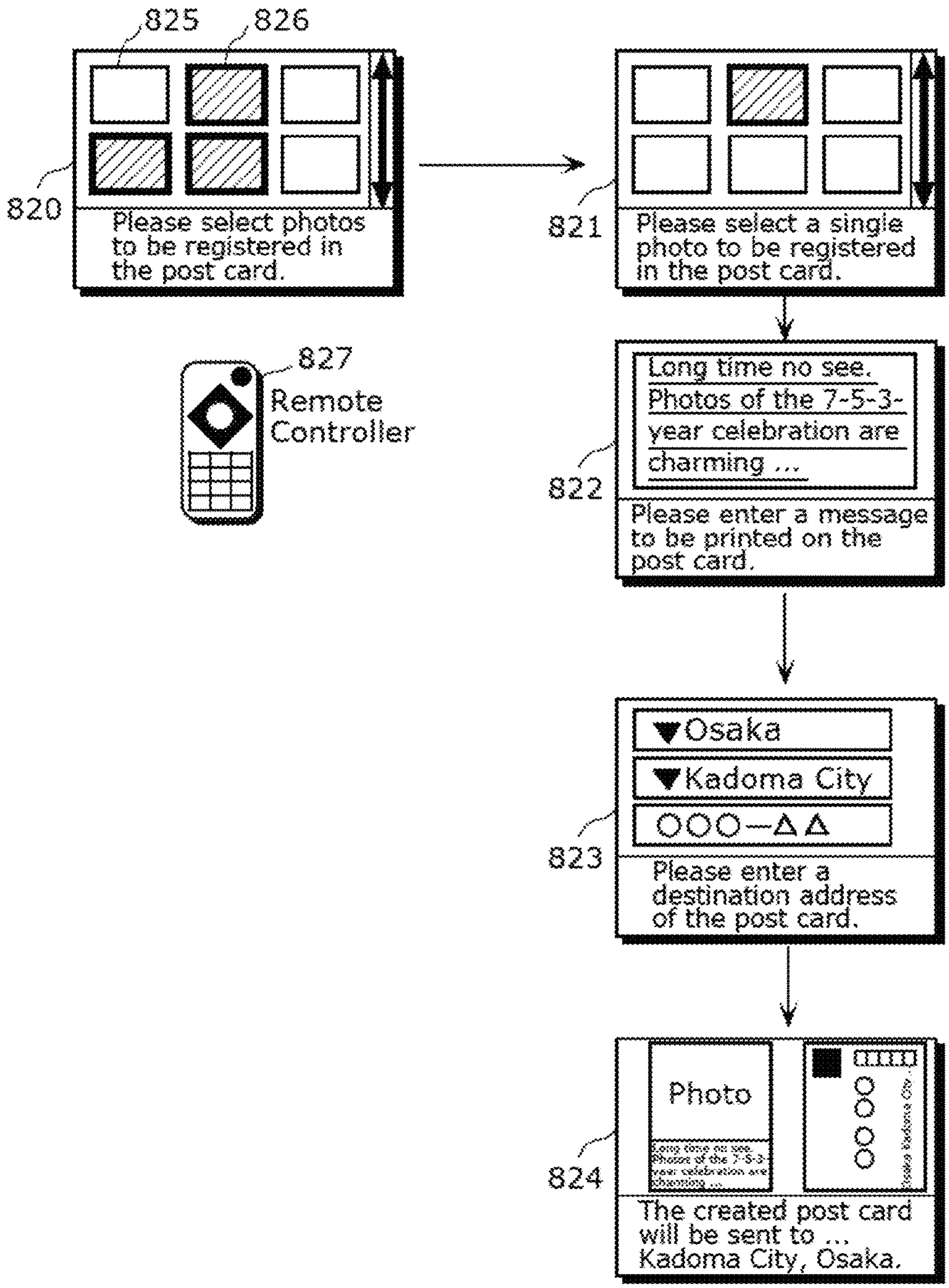

FIG. 374 is a diagram illustrating screen display in image selection operation by the RF-ID-attached post card mailing system.

Figure 375:
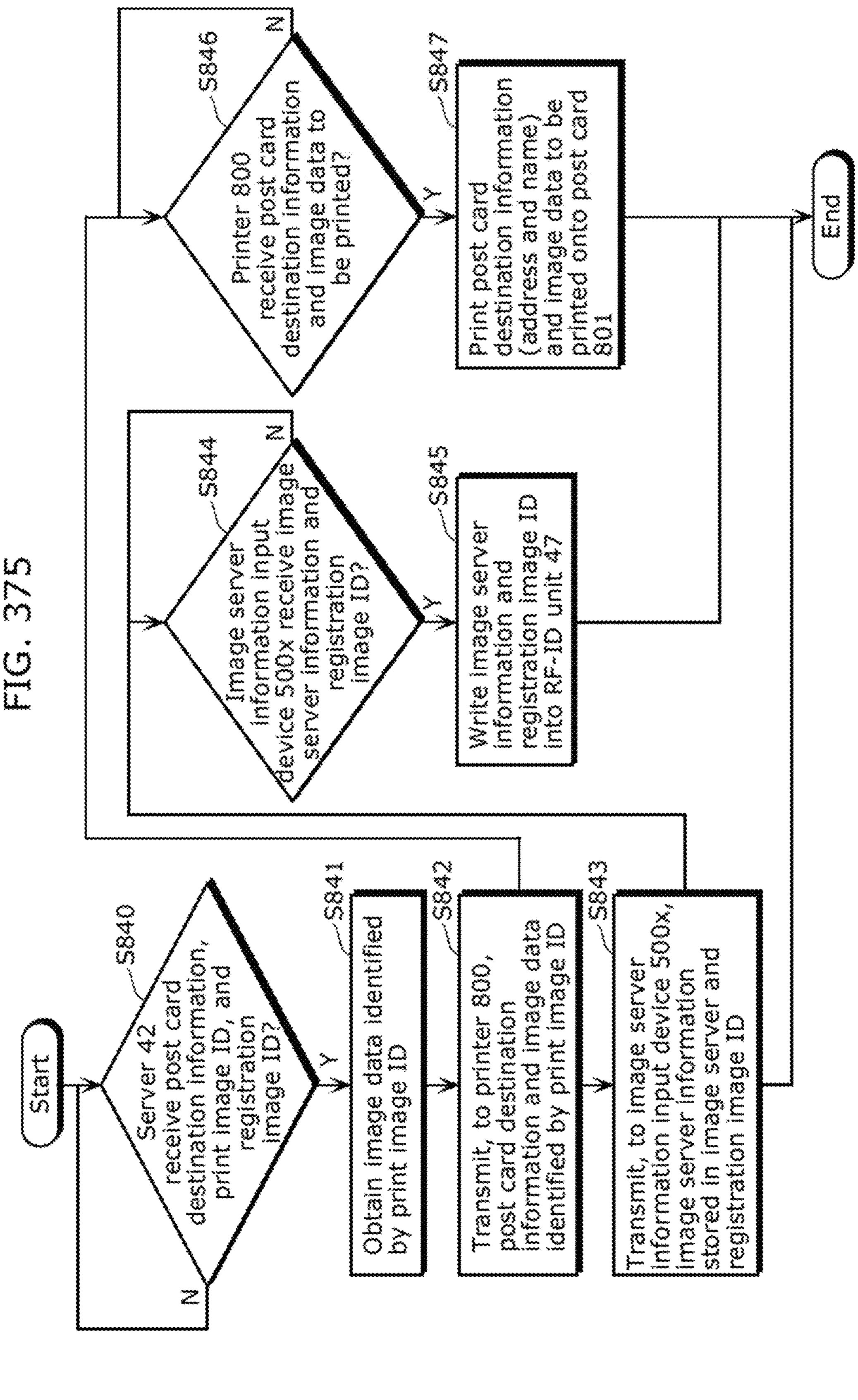

FIG. 375 is a flowchart of steps of processing performed by an image server in the RF-ID-attached post card mailing system.

Figure 376:
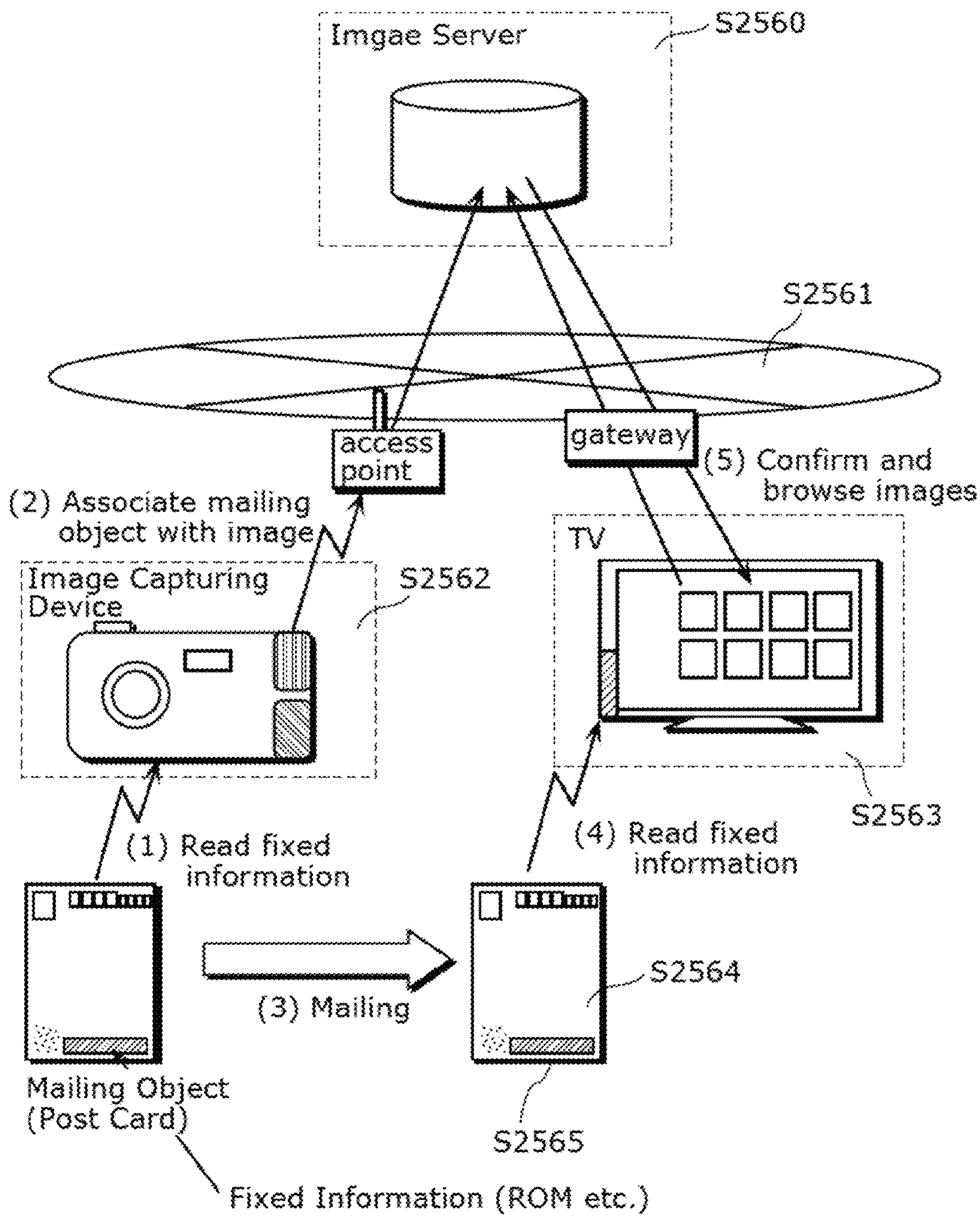

FIG. 376 is a block diagram of a system according to Embodiment A5.

Figure 377:
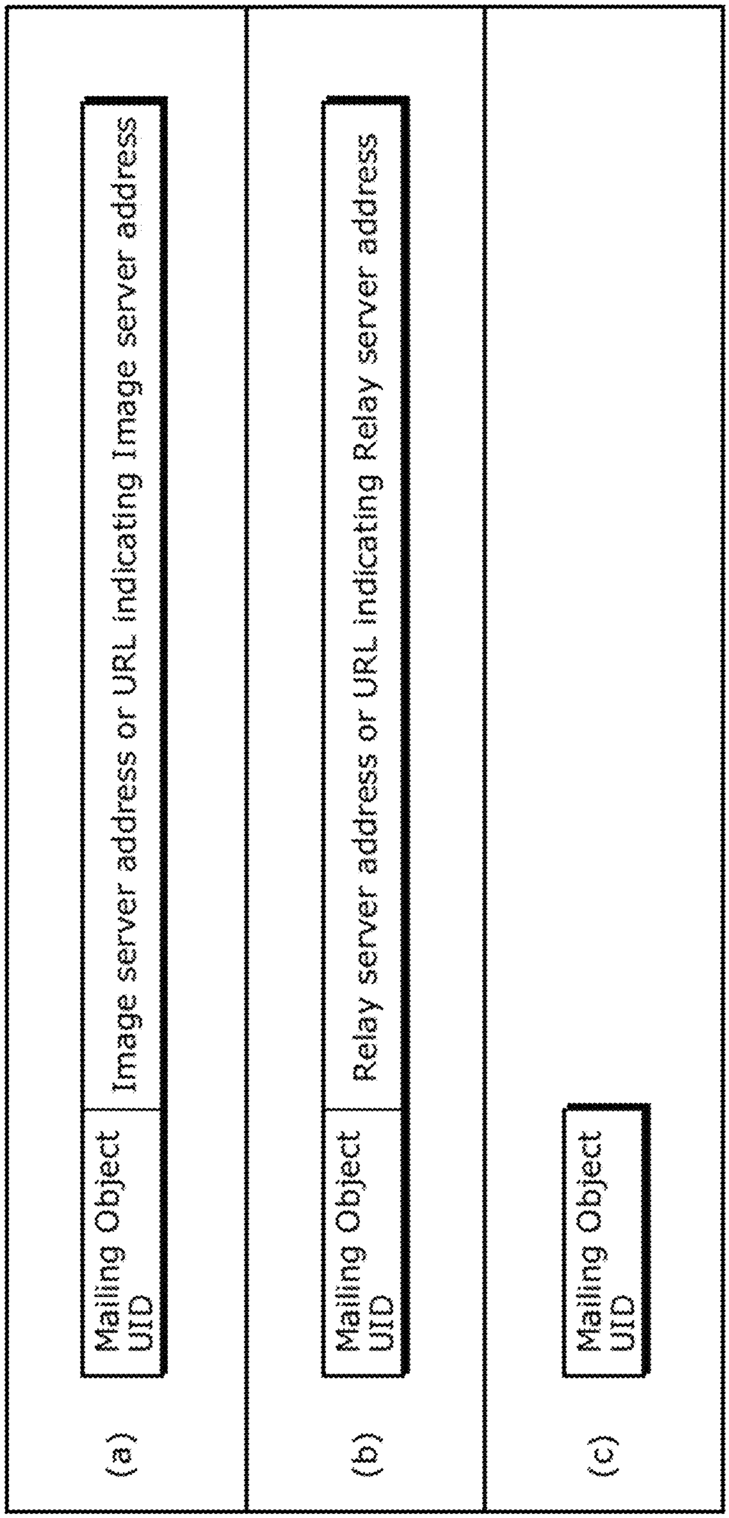

FIG. 377 is a diagram illustrating an example of fixed information of a mailing object according to Embodiment A5.

Figure 378:
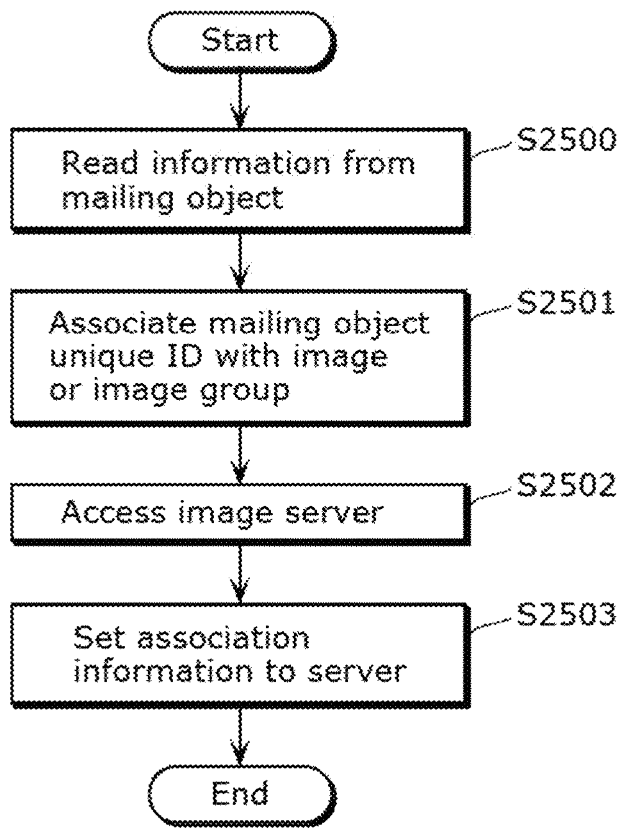

FIG. 378 is a flowchart of processing for associating an image capturing device with an image server, according to Embodiment A5.

Figure 379:
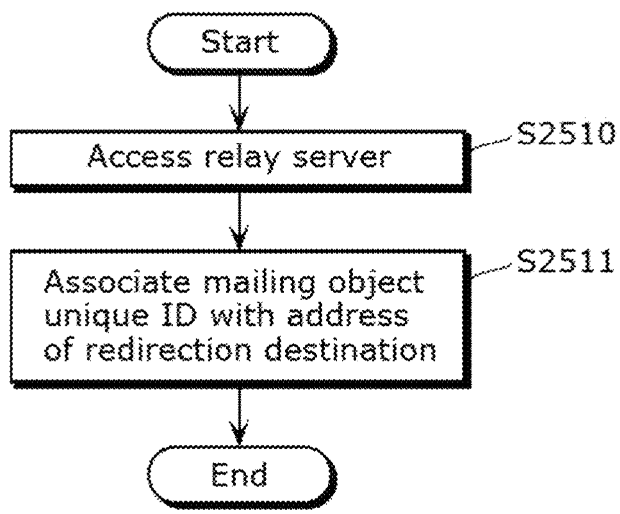

FIG. 379 is a flowchart of processing for registering the image capturing device with a relay server, according to Embodiment A5.

Figure 380:
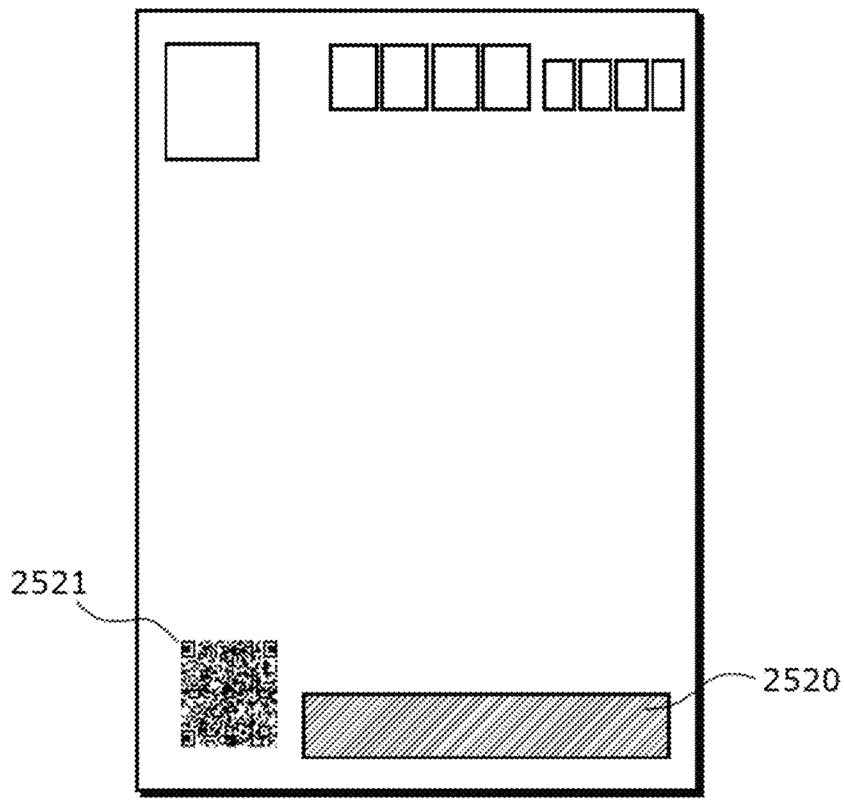

FIG. 380 is a diagram illustrating an example of a mailing object attached with a 2-dimensional code.

Figure 381:
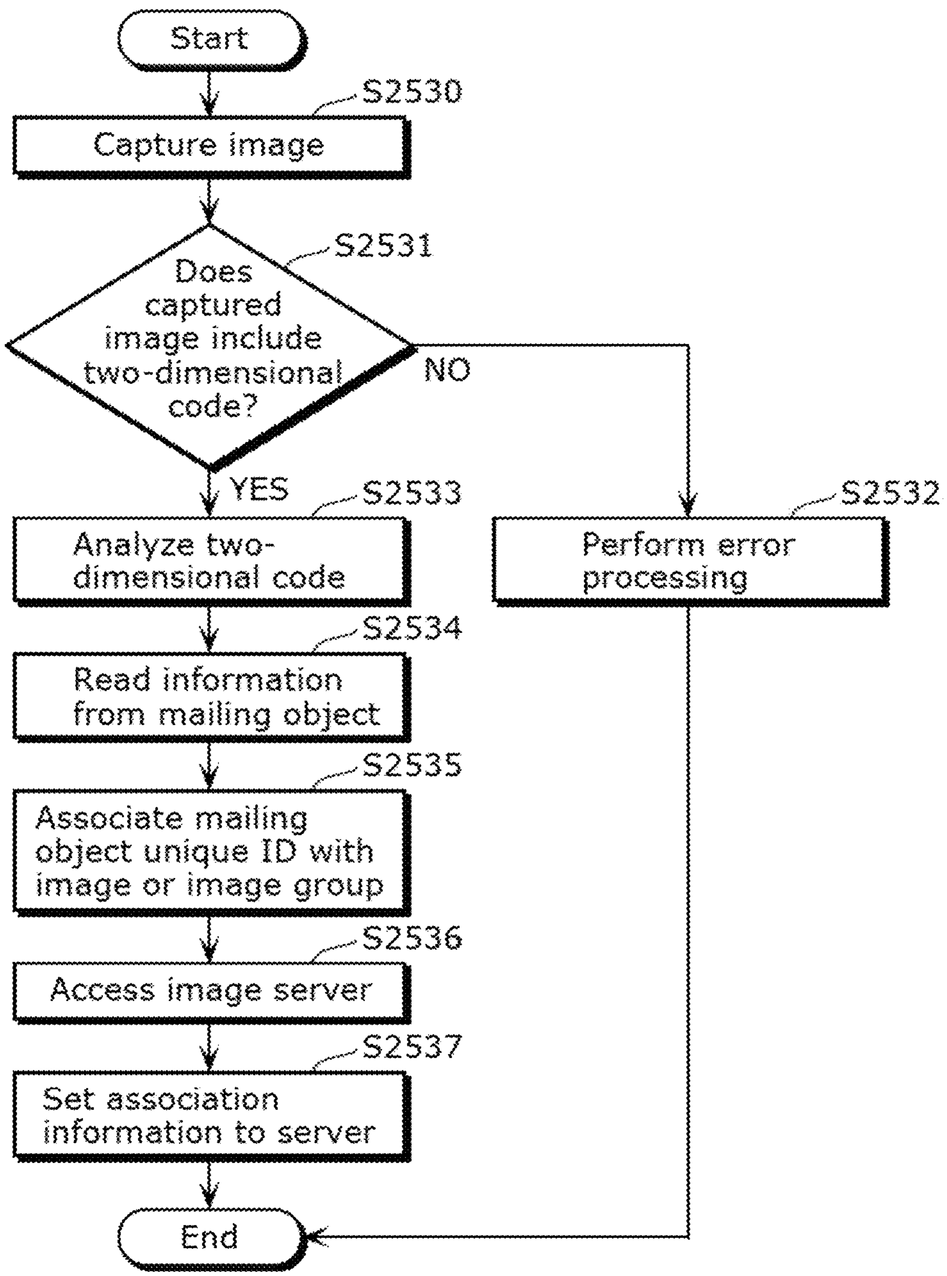

FIG. 381 is a flowchart of processing using a 2-dimensional bar-code of the image capturing device according to Embodiment A5.

Figure 382:
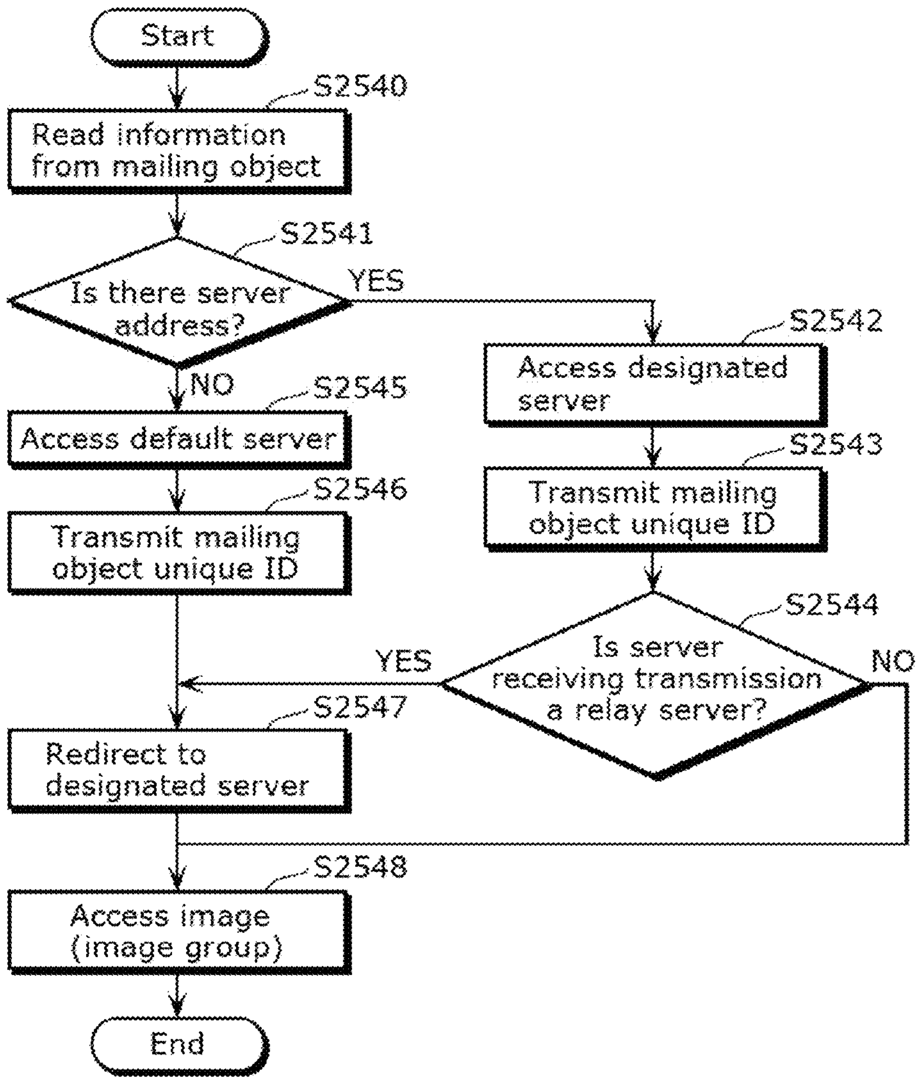

FIG. 382 is a flowchart of processing performed by a TV according to Embodiment A5.

Figure 383:
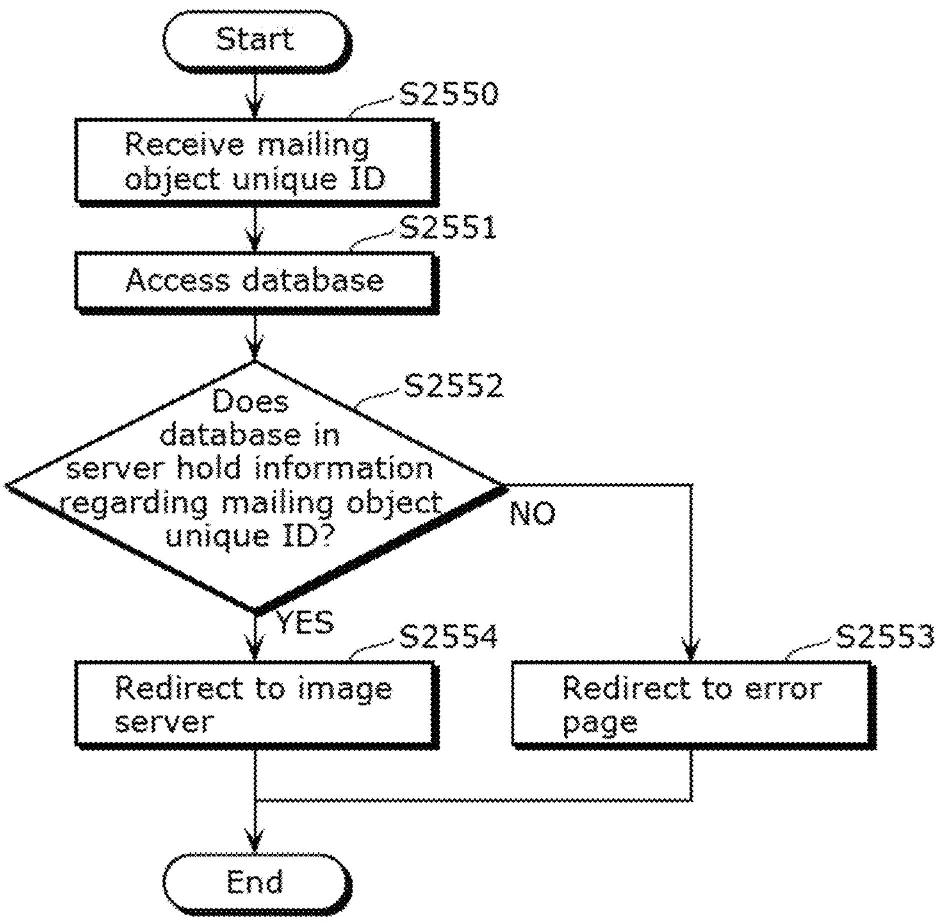

FIG. 383 is a flowchart of processing performed by the relay server according to Embodiment A5.

Figure 384:
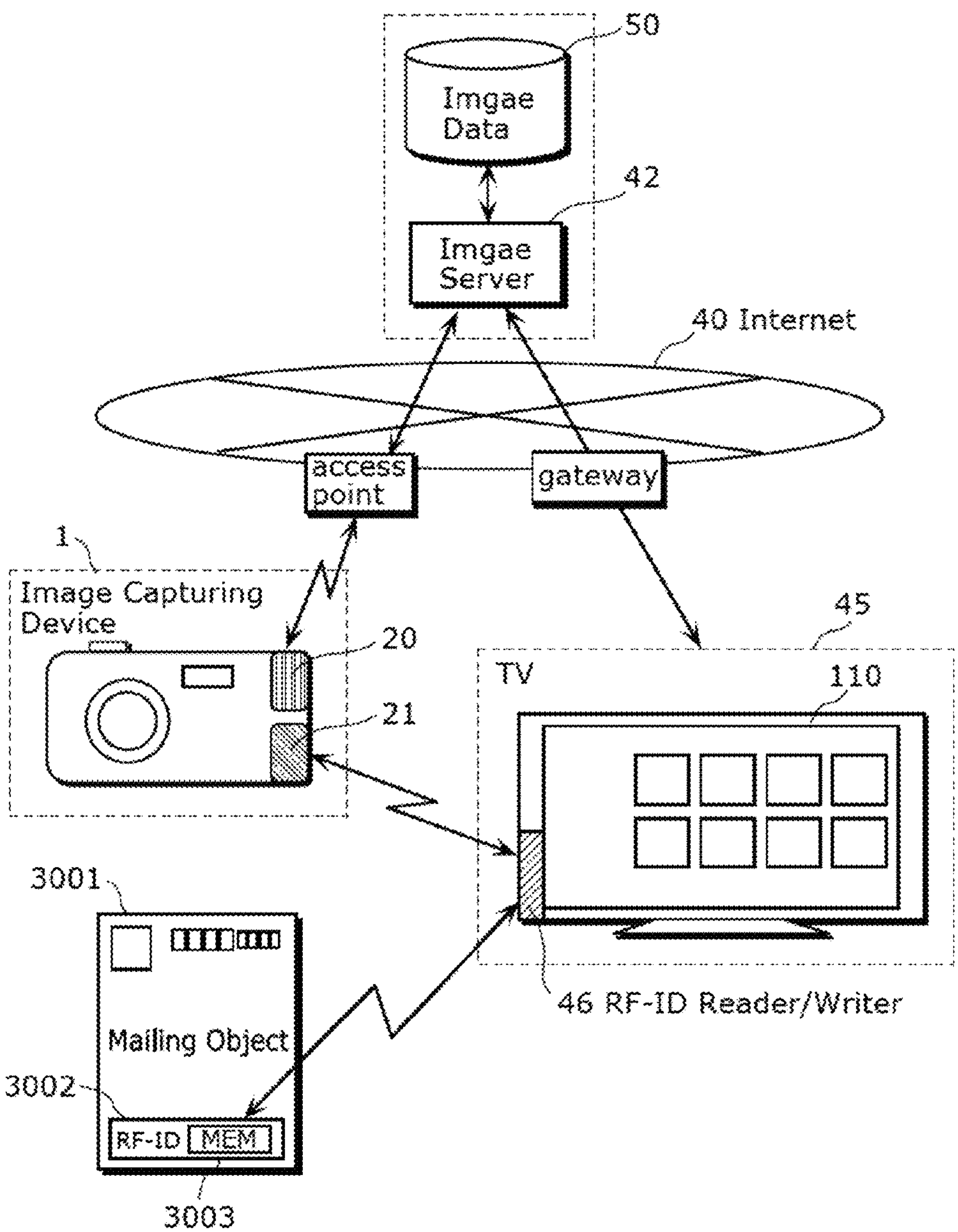

FIG. 384 is a schematic diagram of an image transmitting side according to Embodiment A6.

Figure 385:
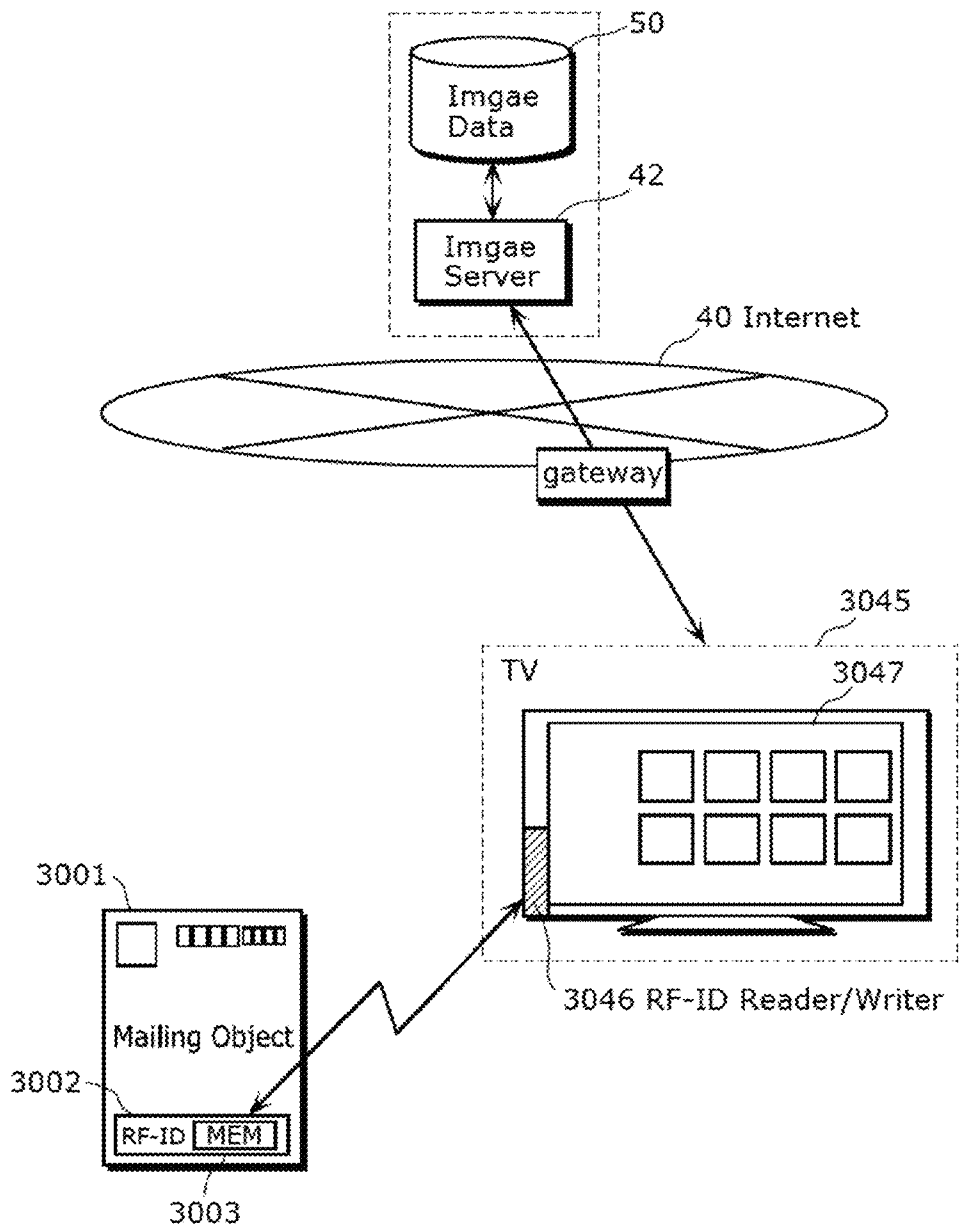

FIG. 385 is a schematic diagram of an image receiving side according to Embodiment A6.

Figure 386:
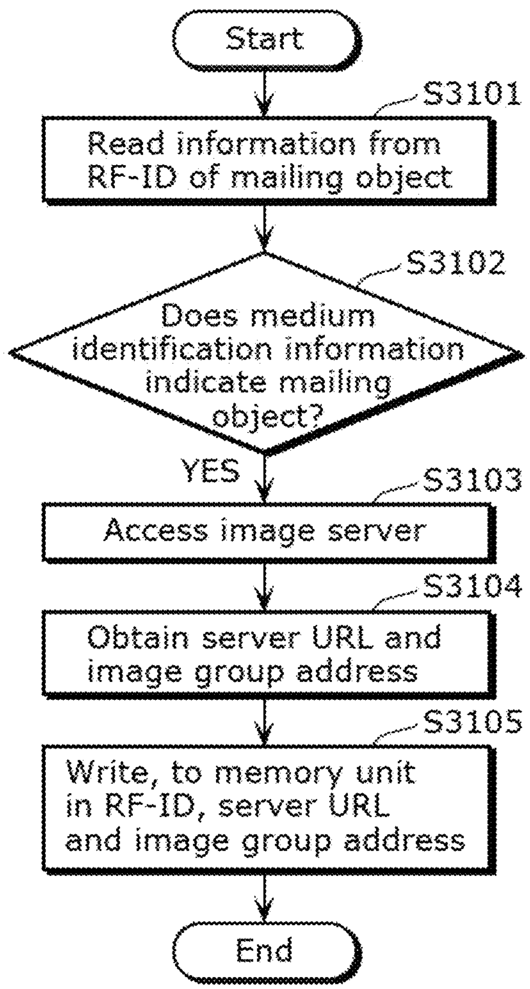

FIG. 386 is a flowchart of processing performed by a TV transmitting image according to Embodiment A6.

Figure 387:
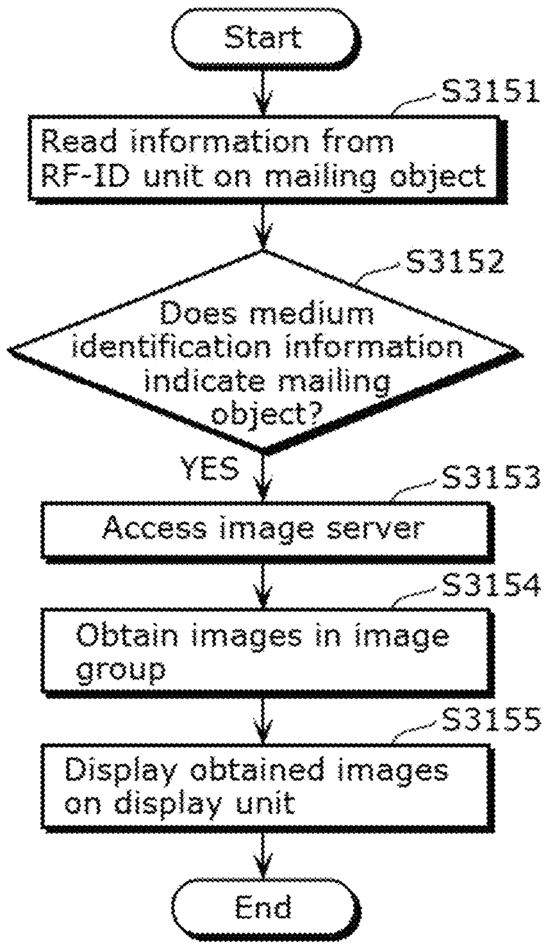

FIG. 387 is a flowchart of processing performed by a TV receiving image according to Embodiment A6.

Figure 388:
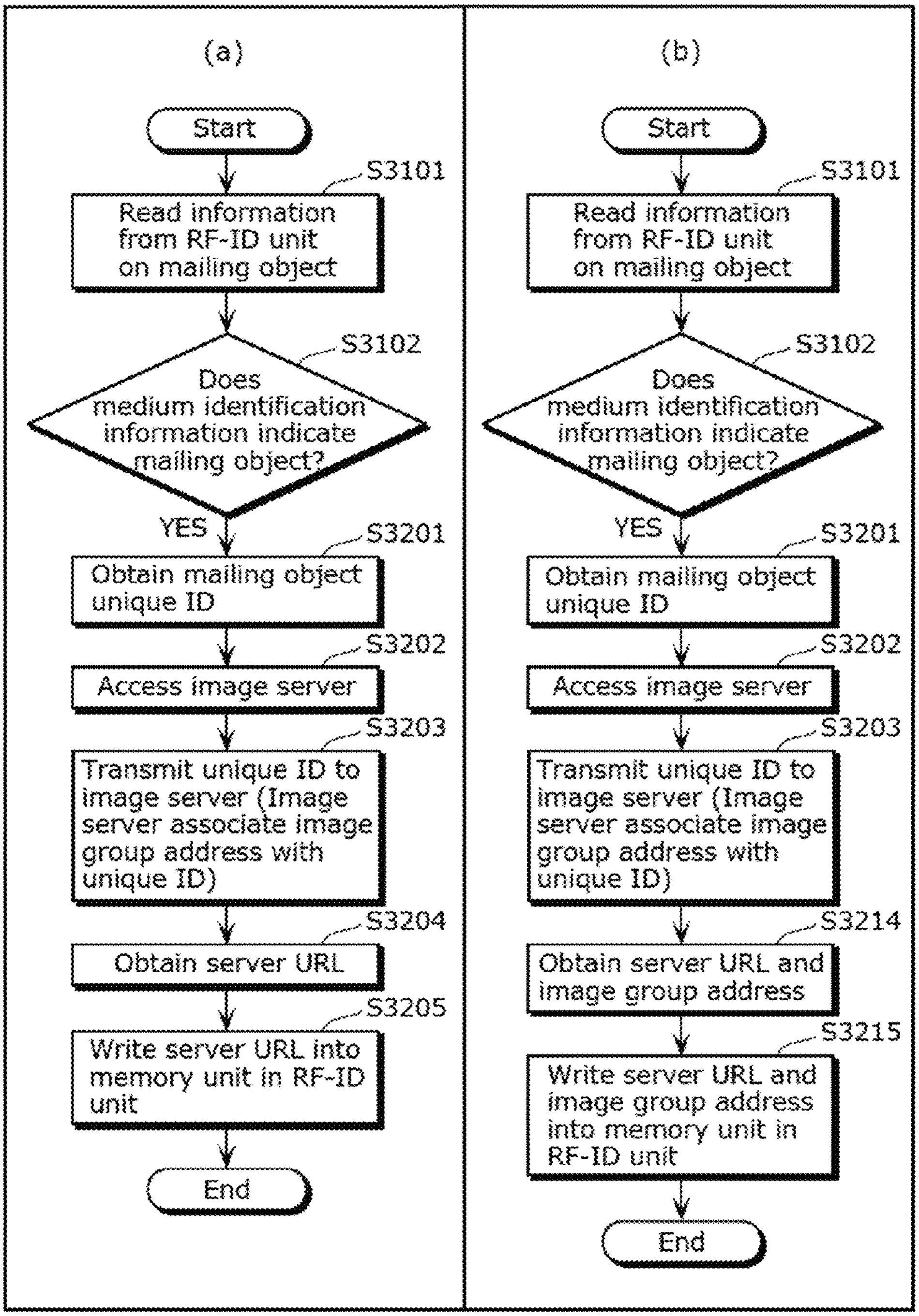

FIG. 388 is a flowchart of another example of processing performed by the TV transmitting image according to Embodiment A6.

Figure 389:
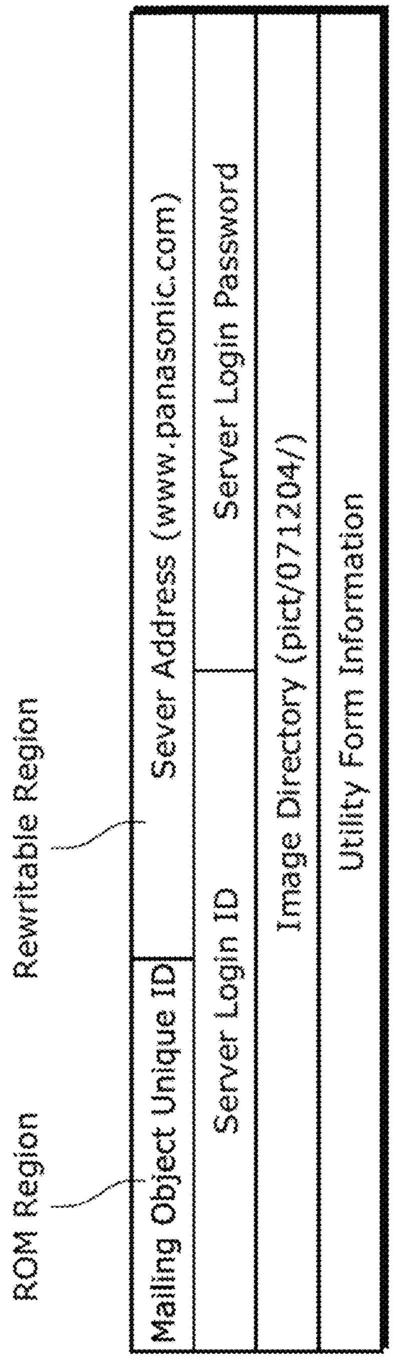

FIG. 389 is a table of an example of information recorded in a mailing object memory unit according to Embodiment A6.

Figure 390:
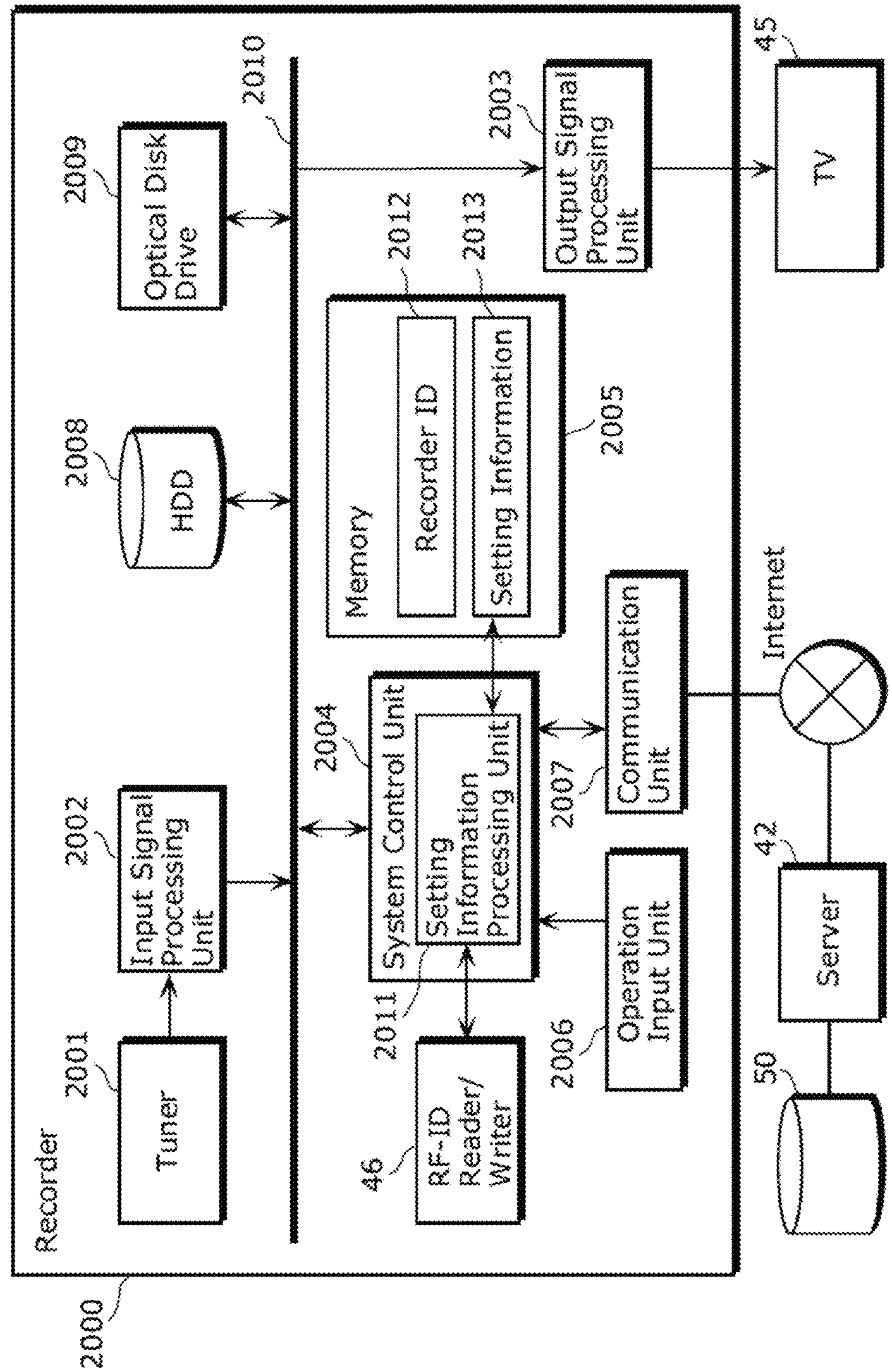

FIG. 390 is a block diagram of a recorder.

Figure 391:
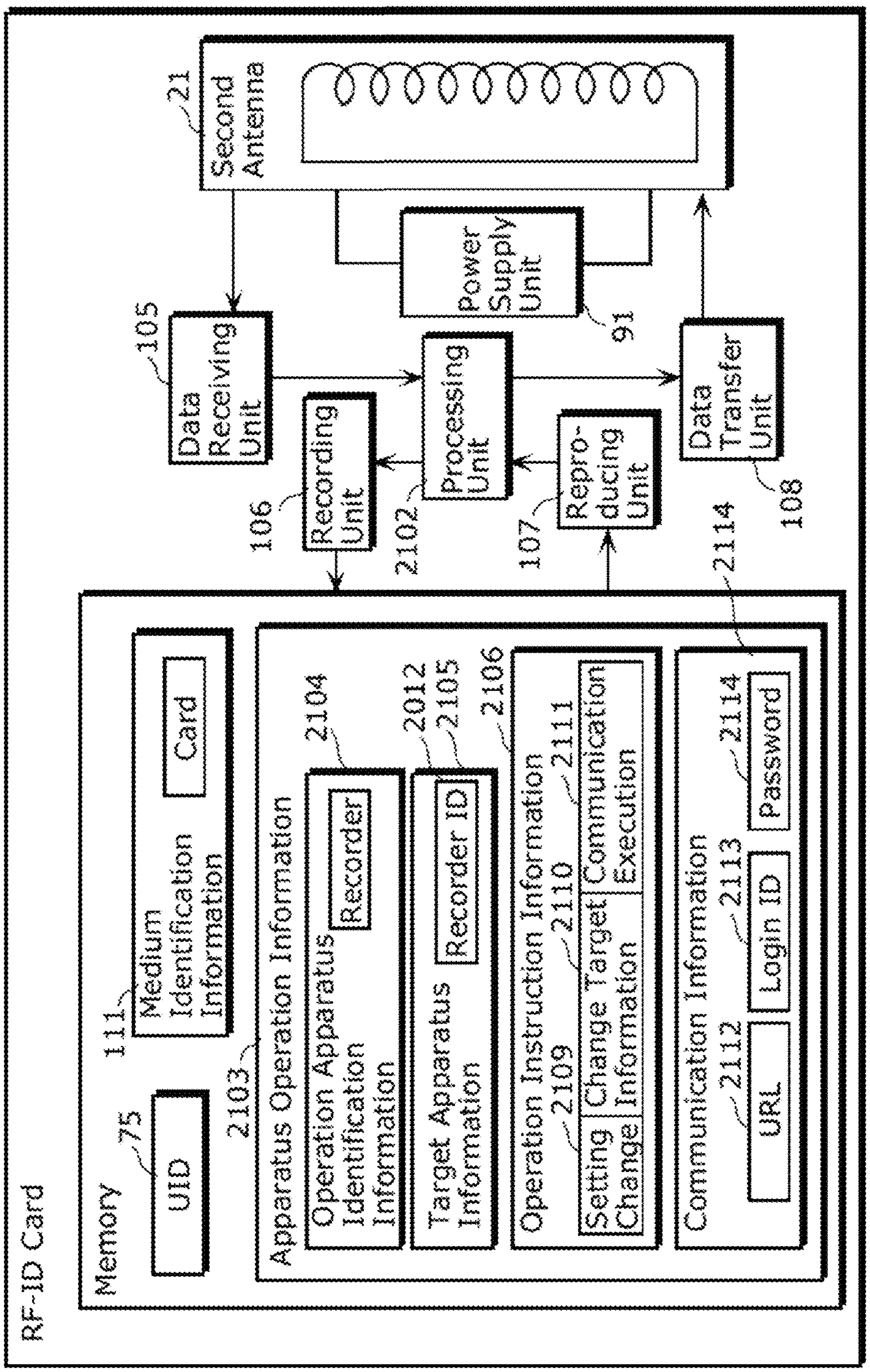

FIG. 391 is a block diagram of a RF-ID card.

Figure 392:
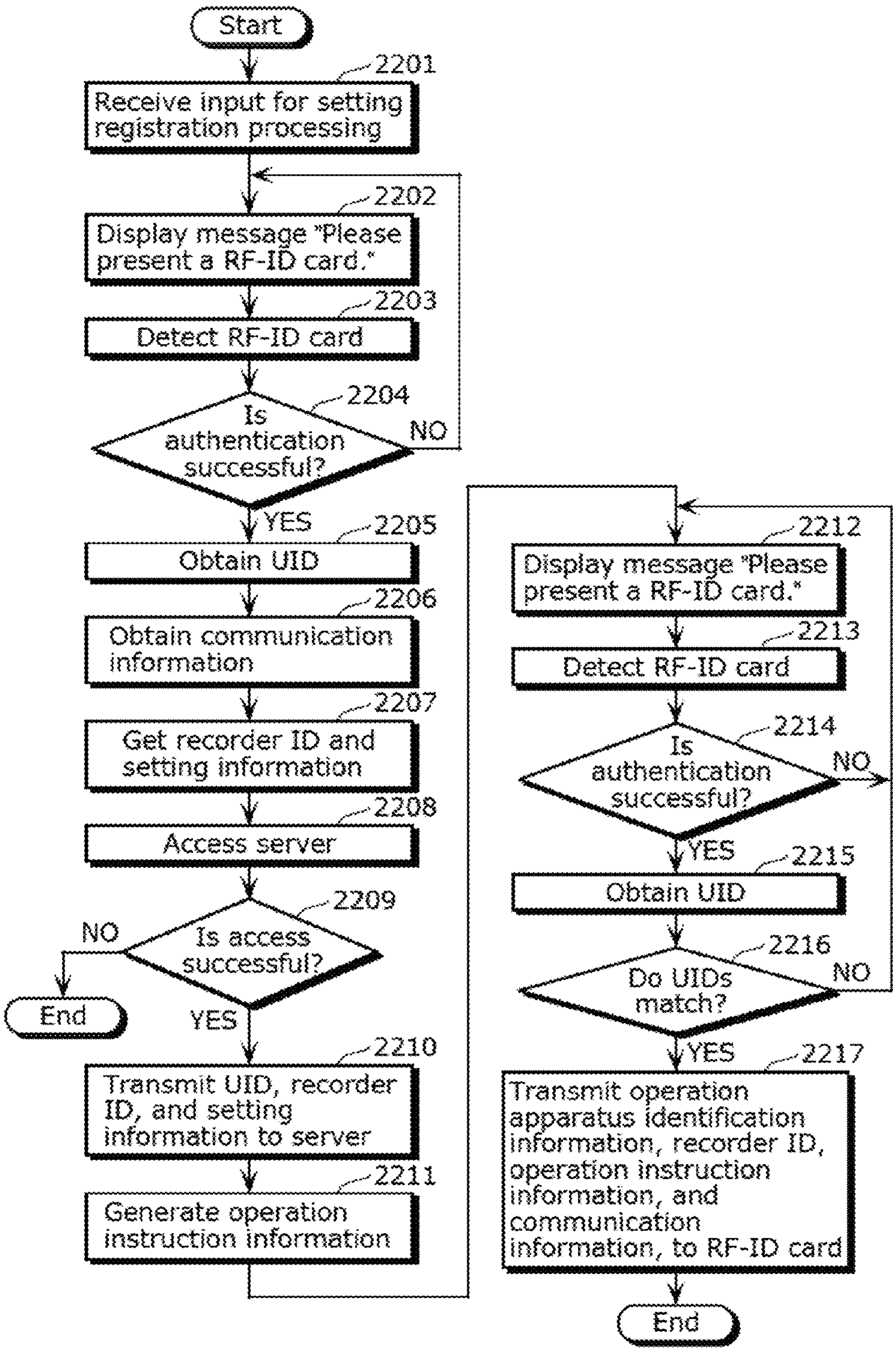

FIG. 392 is a flowchart of steps of registering setting information to a server.

FIG. 393 is a diagram illustrating a structure of pieces of setting information registered in the server.

FIG. 394 is a diagram illustrating a structure of pieces of apparatus operation information registered in the RF-ID card.

Figure 395:
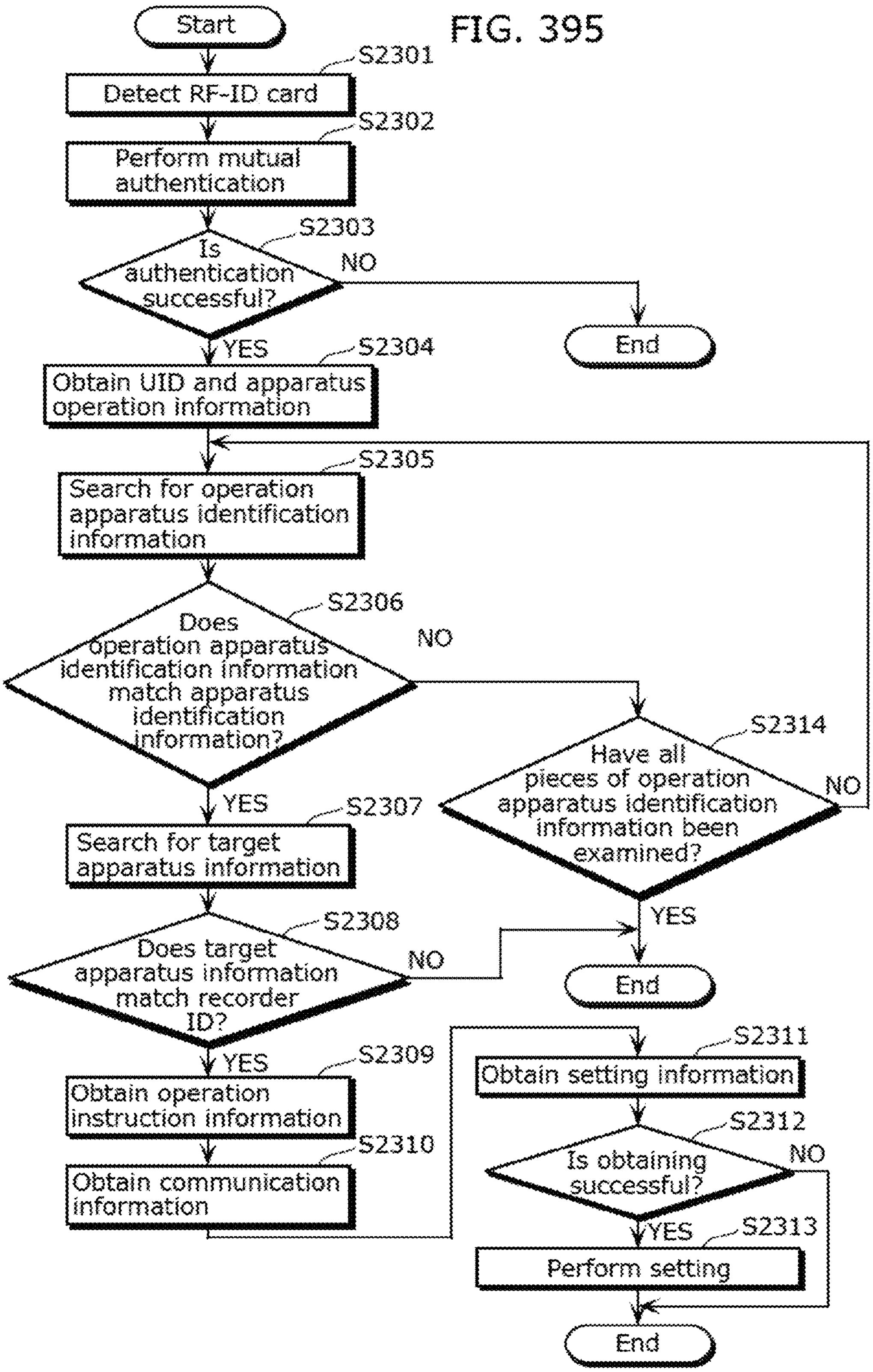

FIG. 395 is a flowchart of steps of updating setting information of a recorder by the RF-ID card.

Figure 396:
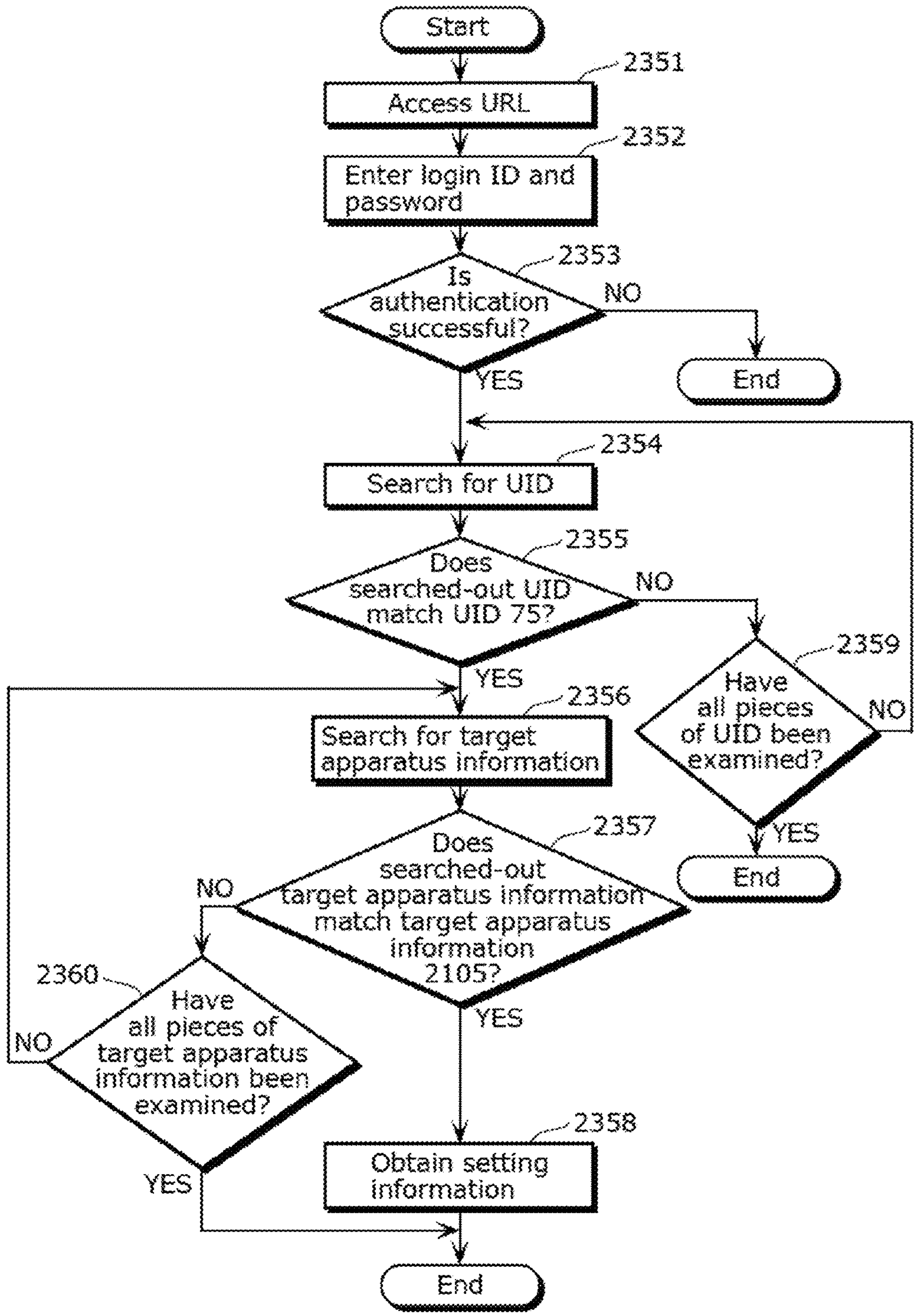

FIG. 396 is a flowchart of steps of obtaining the setting information from the server.

FIG. 397 is a diagram illustrating a structure of apparatus operation information registered in the RF-ID card used in the recorder.

FIG. 398 is a diagram illustrating a structure of apparatus operation information registered in the RF-ID card used in a vehicle navigation device.

Figure 399:
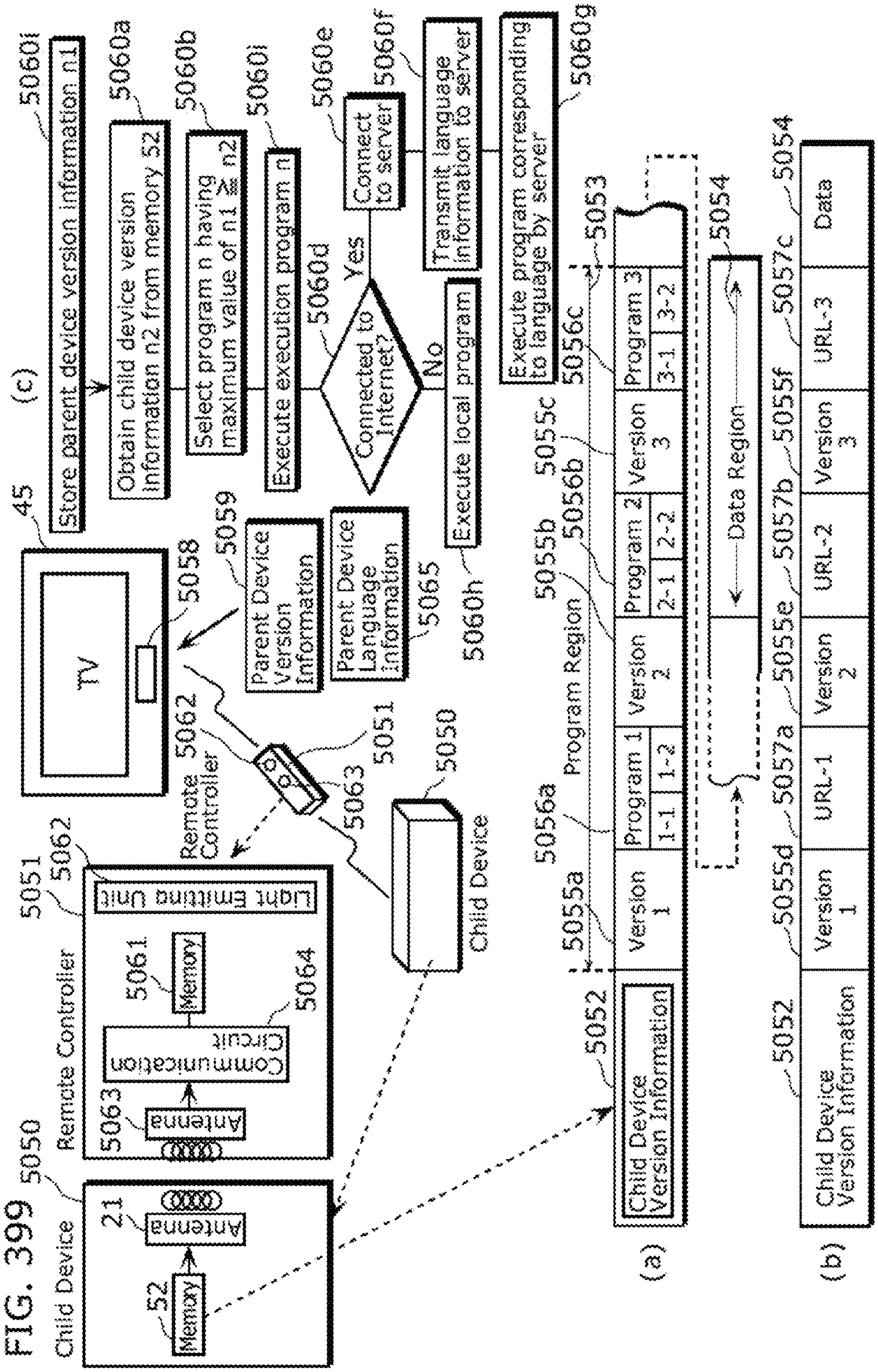

FIG. 399 is a block diagram of a configuration where a remote controller of a TV or the like has a RF-ID reader, according to an embodiment of the present invention.

Figure 400:
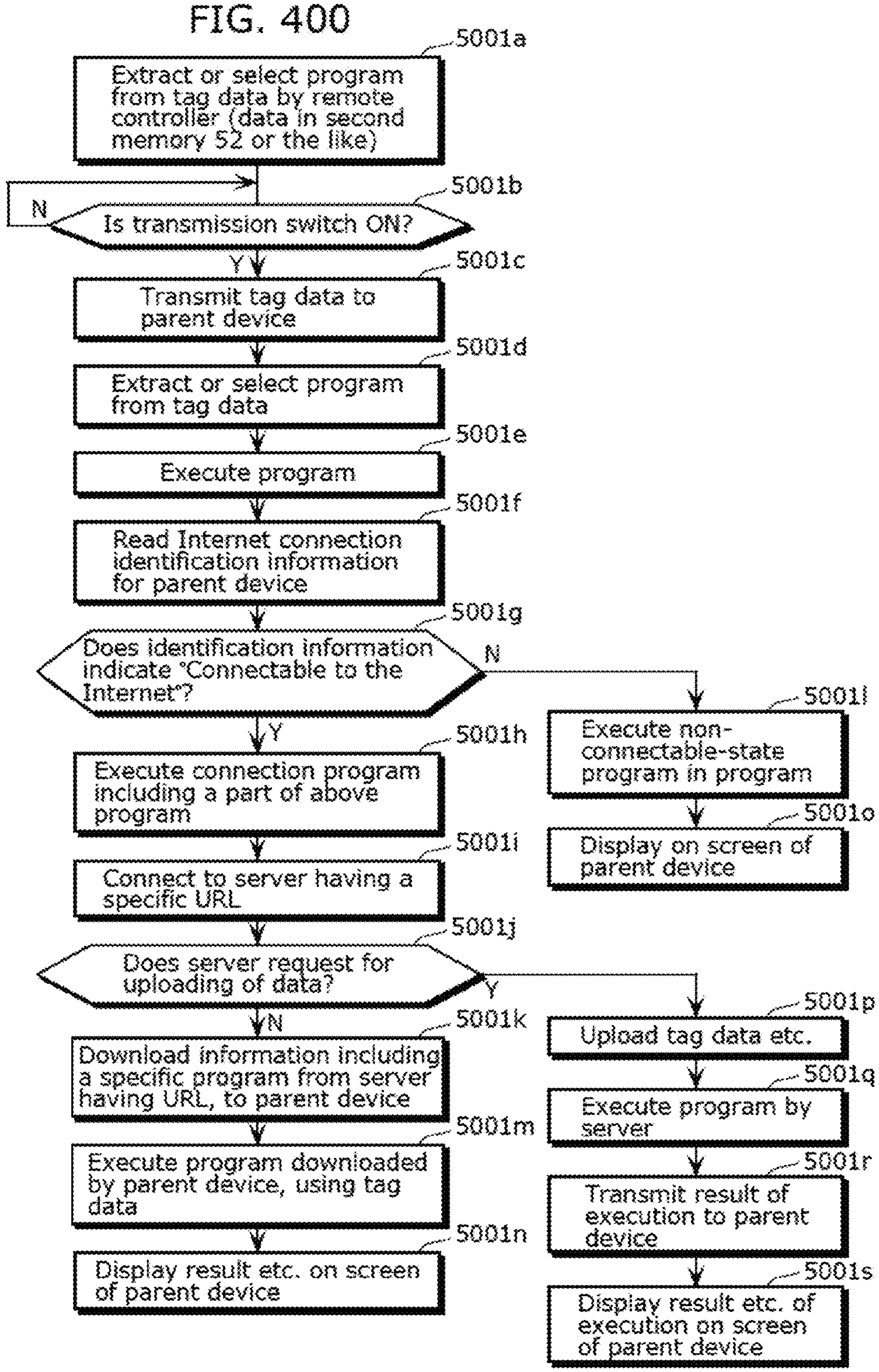

FIG. 400 is a flowchart of processing performed by the above configuration according to the above embodiment.

Figure 401:
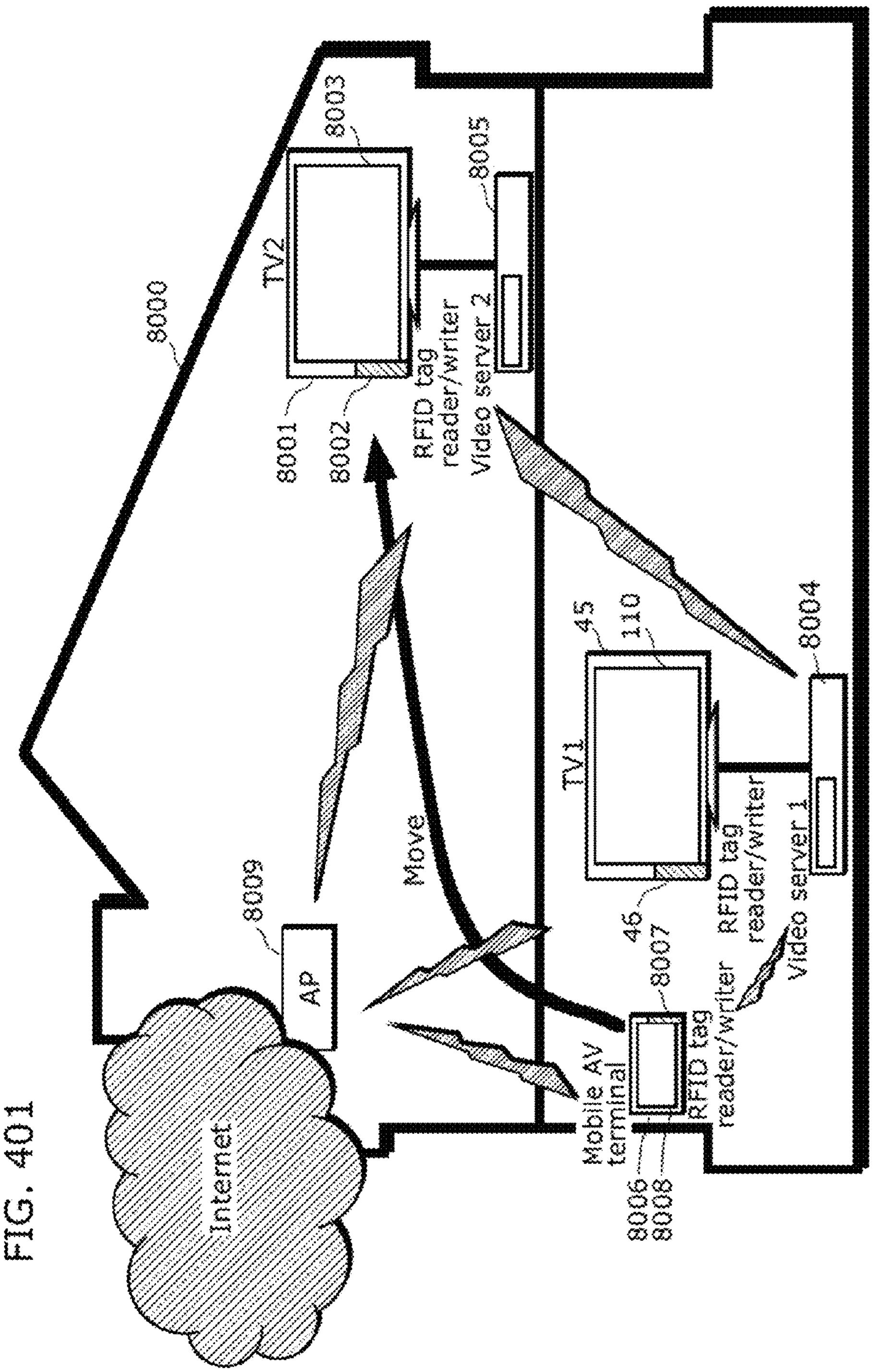

FIG. 401 is a diagram of a network environment.

Figure 402:
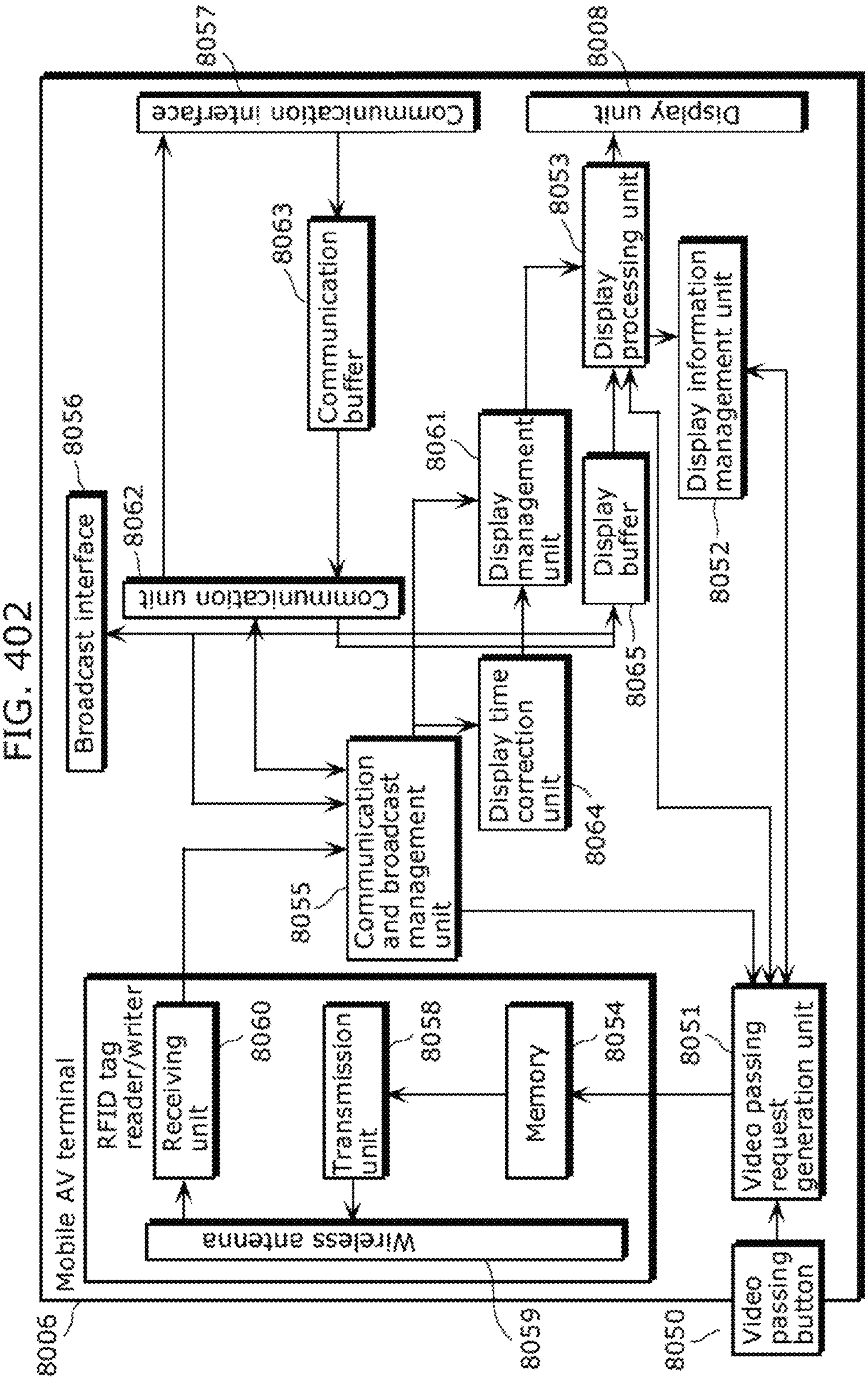

FIG. 402 is a functional block diagram of a mobile AV terminal.

Figure 403:
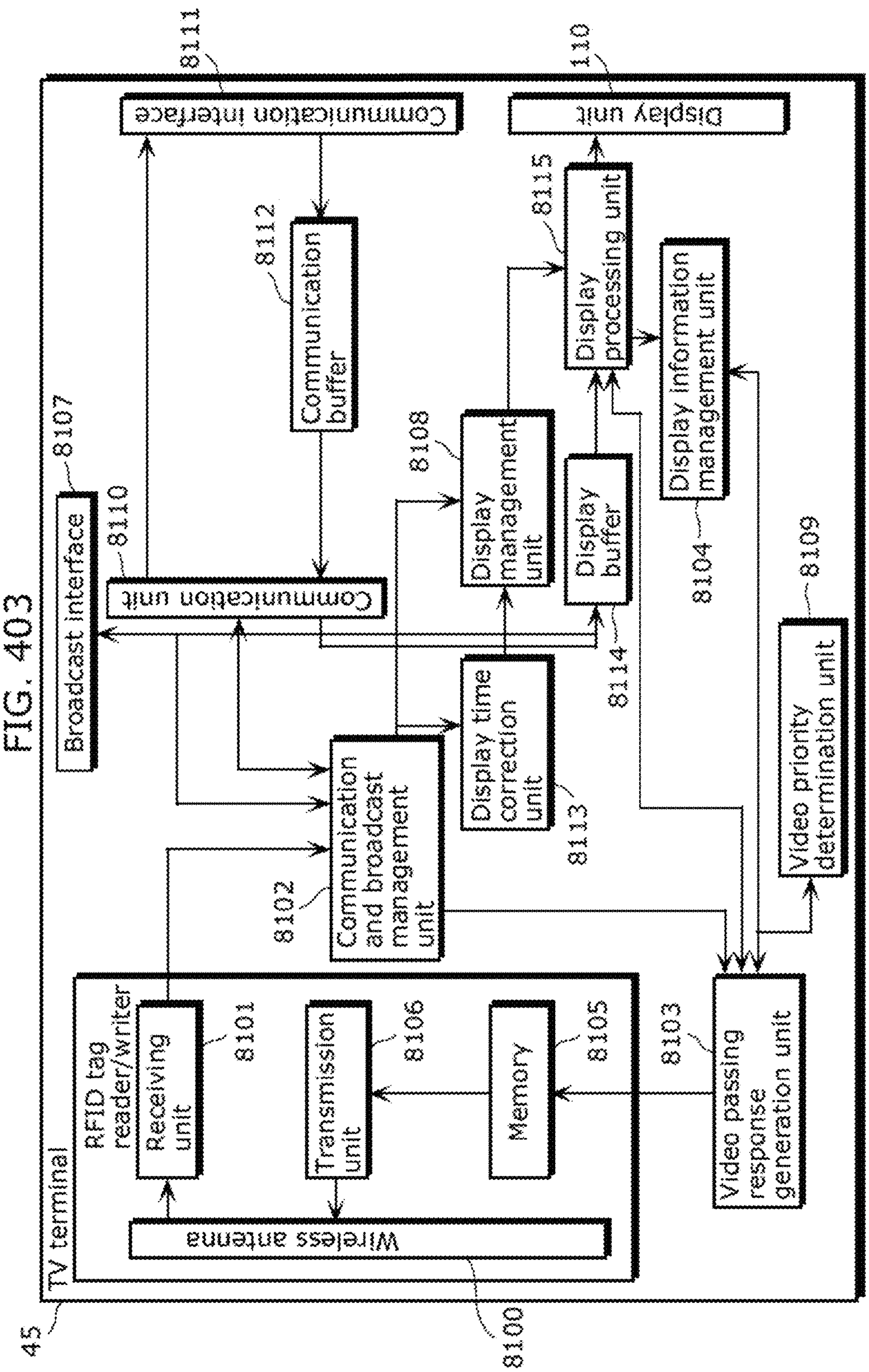

FIG. 403 is a functional block diagram of a TV.

Figure 404:
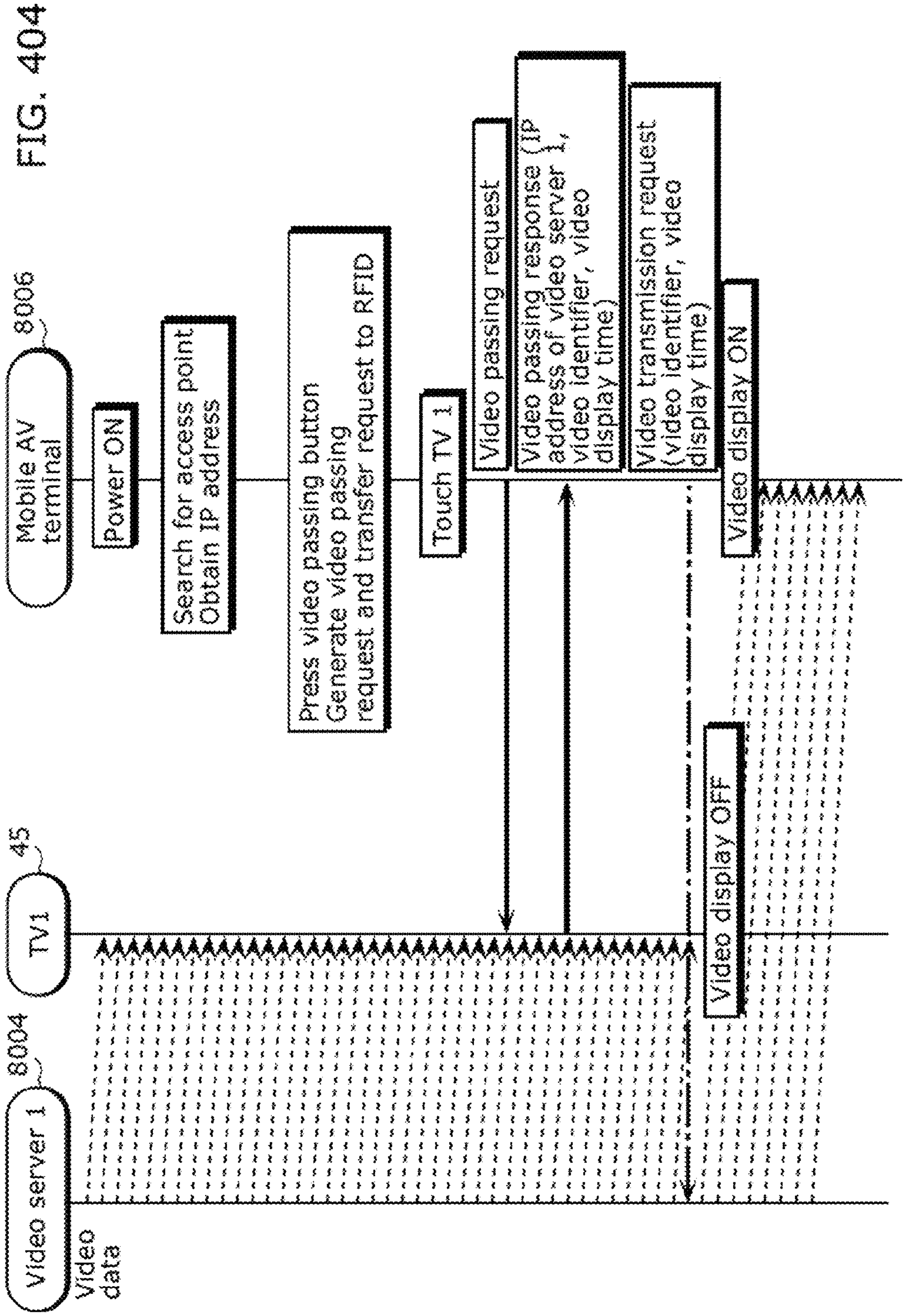

FIG. 404 is a sequence diagram in the case where the mobile AV terminal gets video (first half, control performed by get side).

Figure 405:
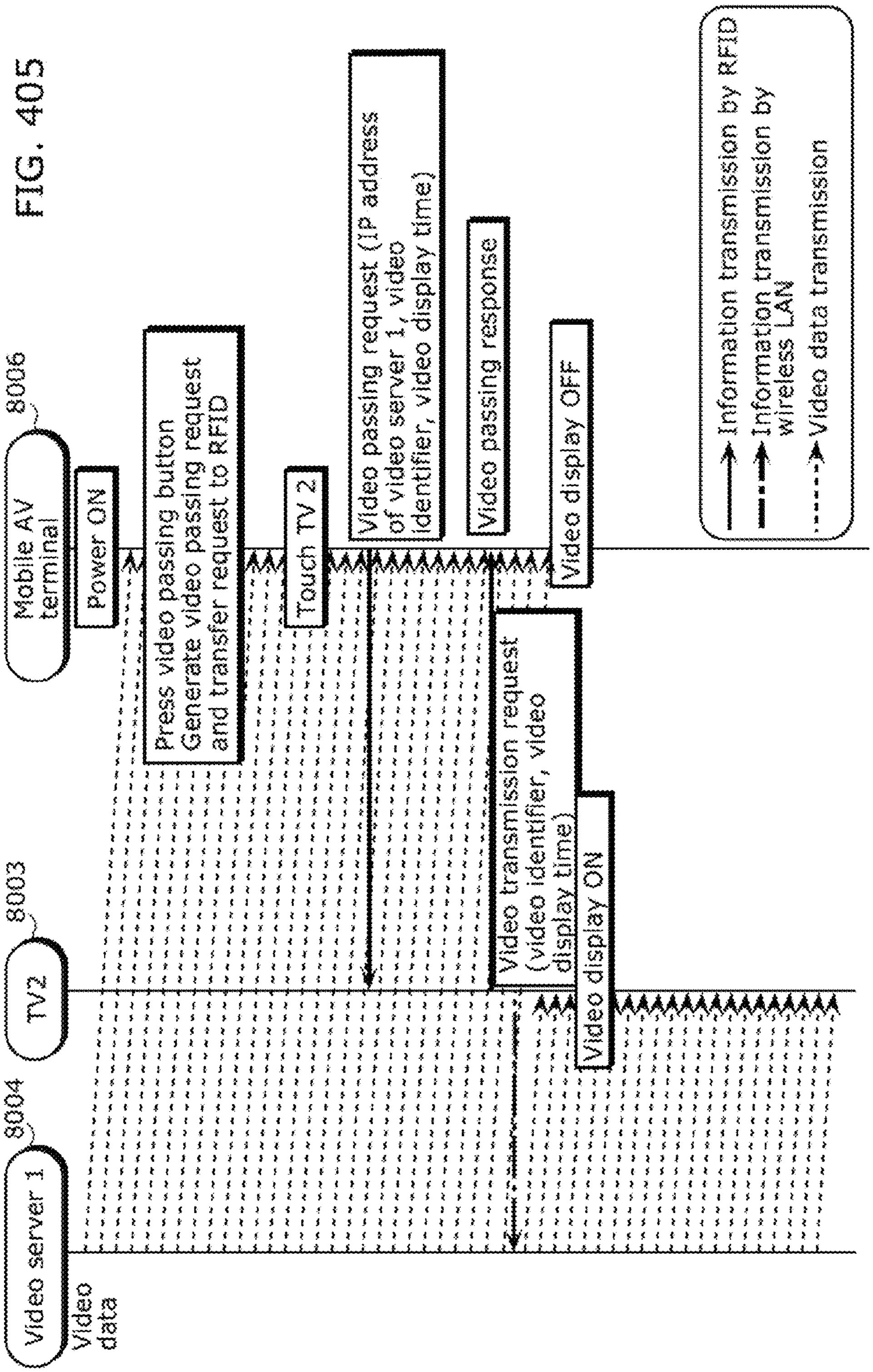

FIG. 405 is a sequence diagram in the case where the mobile AV terminal gives video (second half, control performed by get side).

Figure 406:
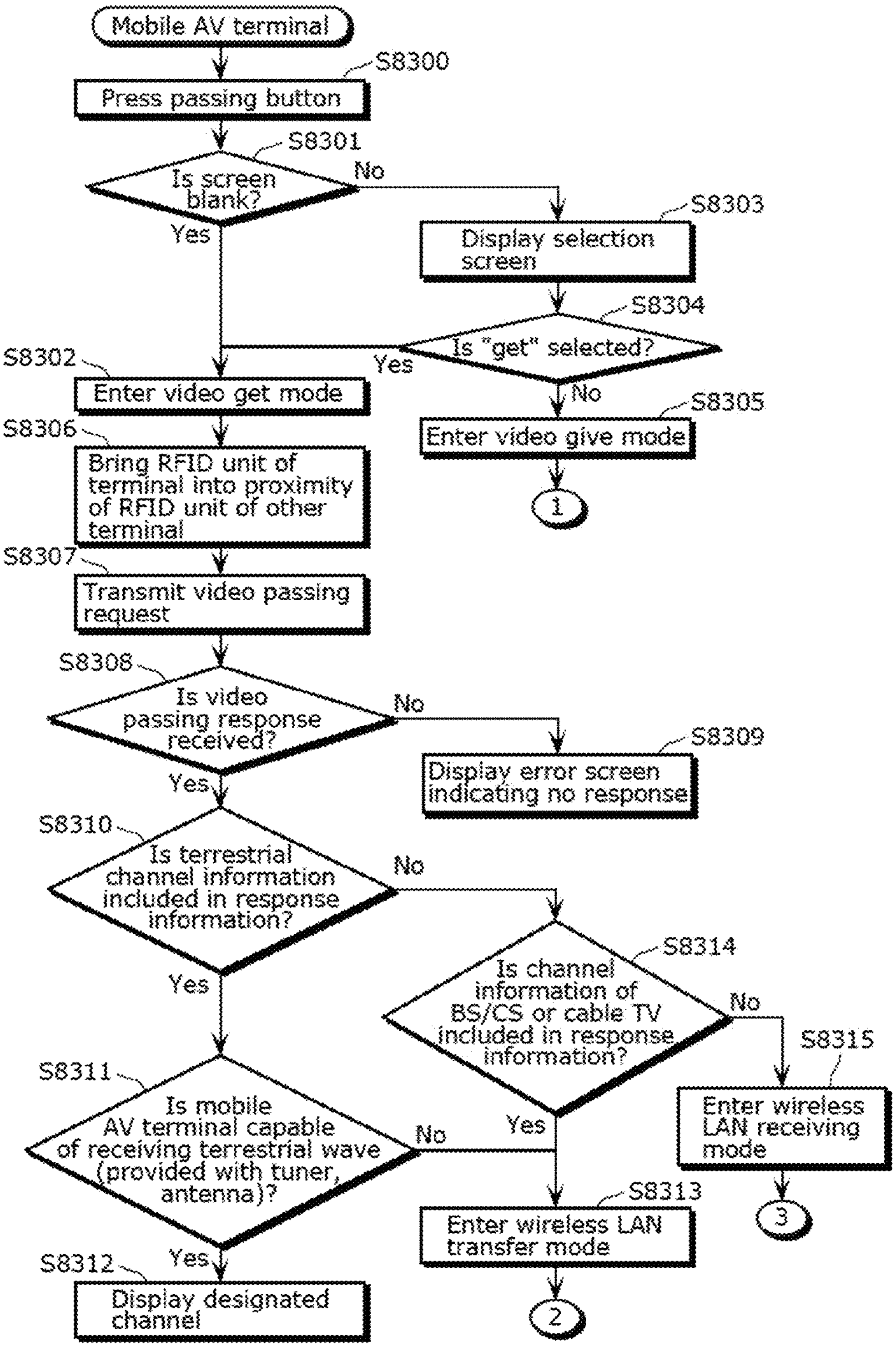

FIG. 406 is a basic flowchart of the mobile AV terminal.

Figure 407:
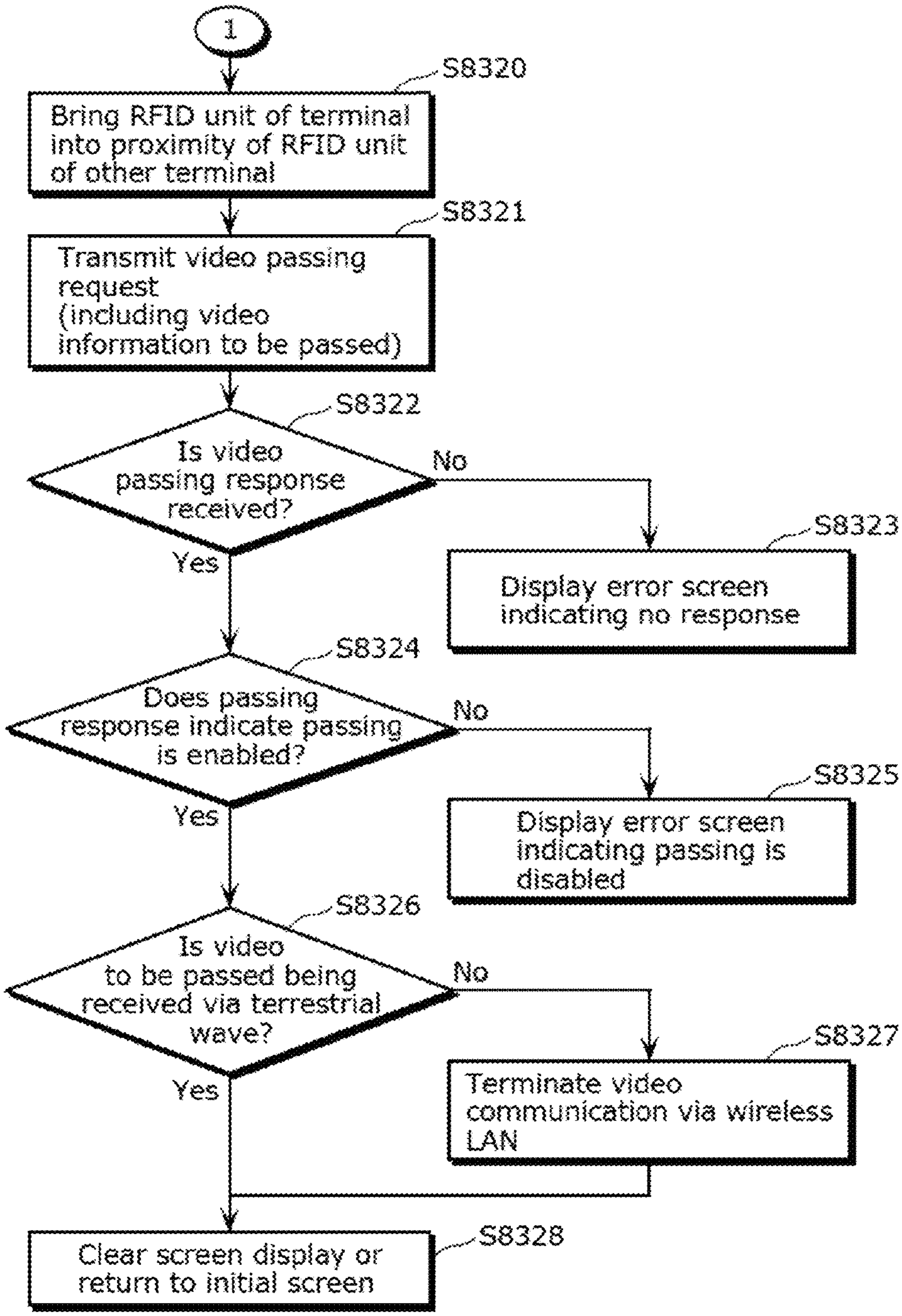

FIG. 407 is a flowchart of a give mode of the mobile AV terminal.

Figure 408:
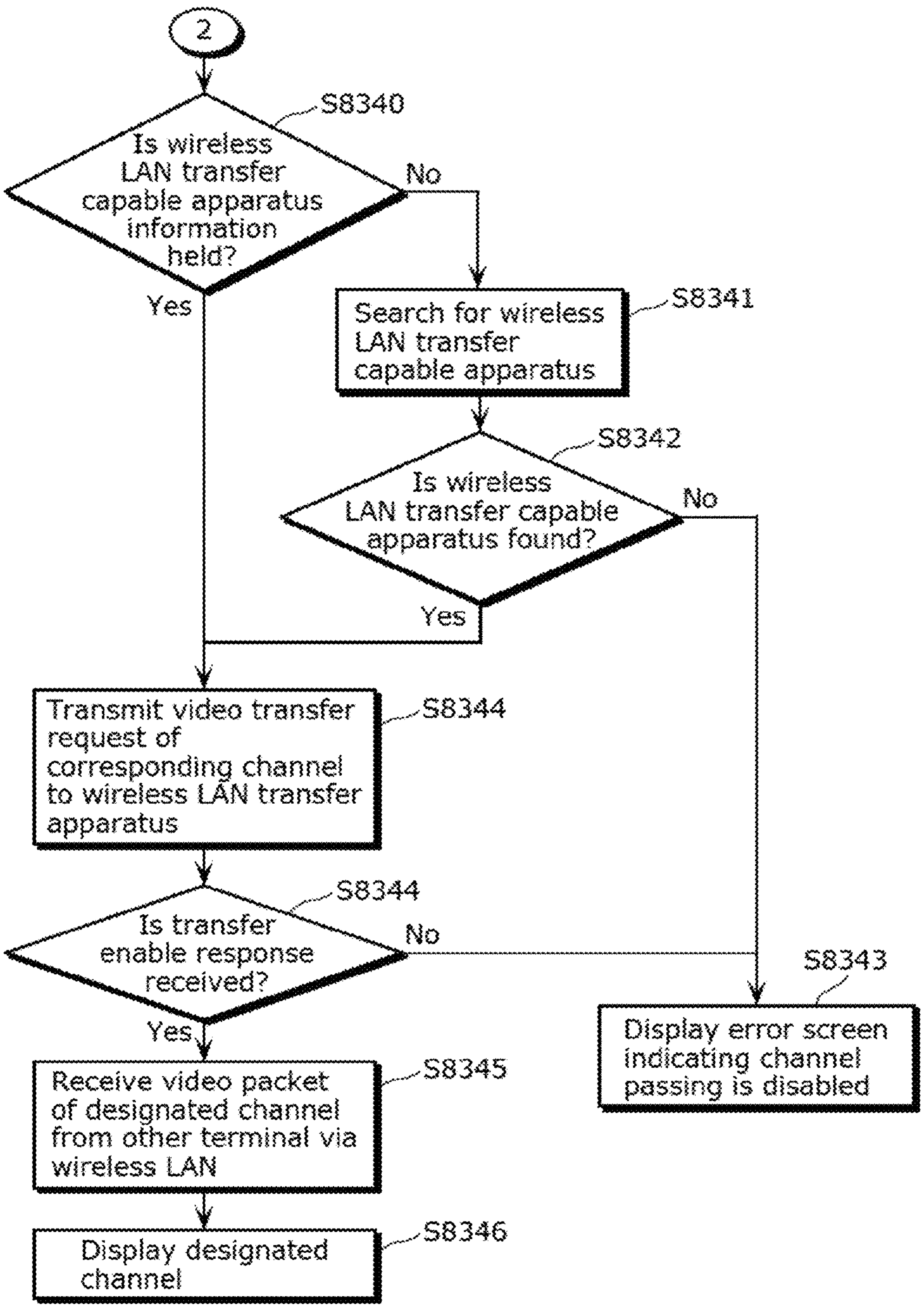

FIG. 408 is a flowchart of a get mode of the mobile AV terminal.

Figure 409:
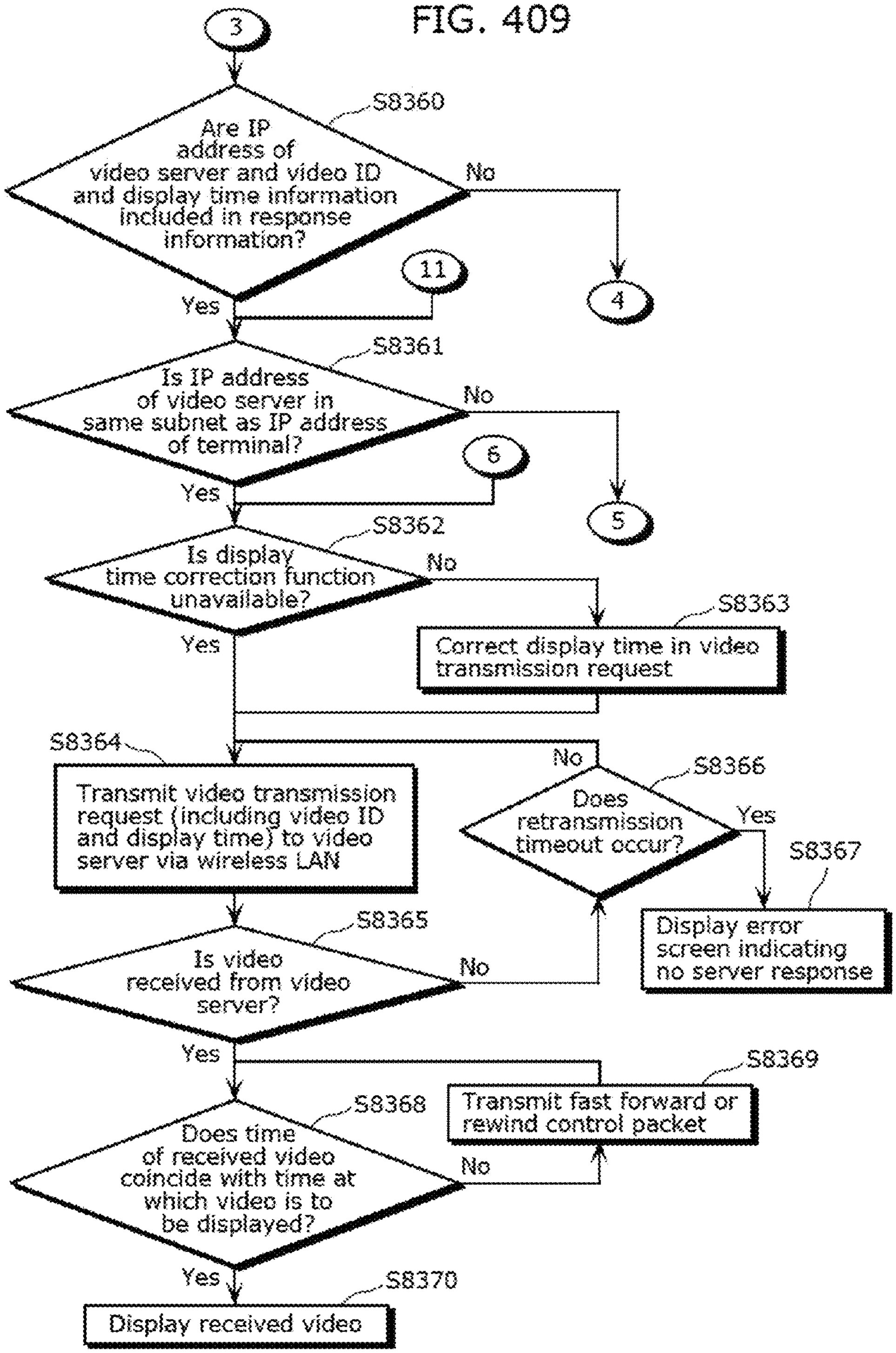

FIG. 409 is a flowchart of a wireless get mode of the mobile AV terminal.

Figure 410:
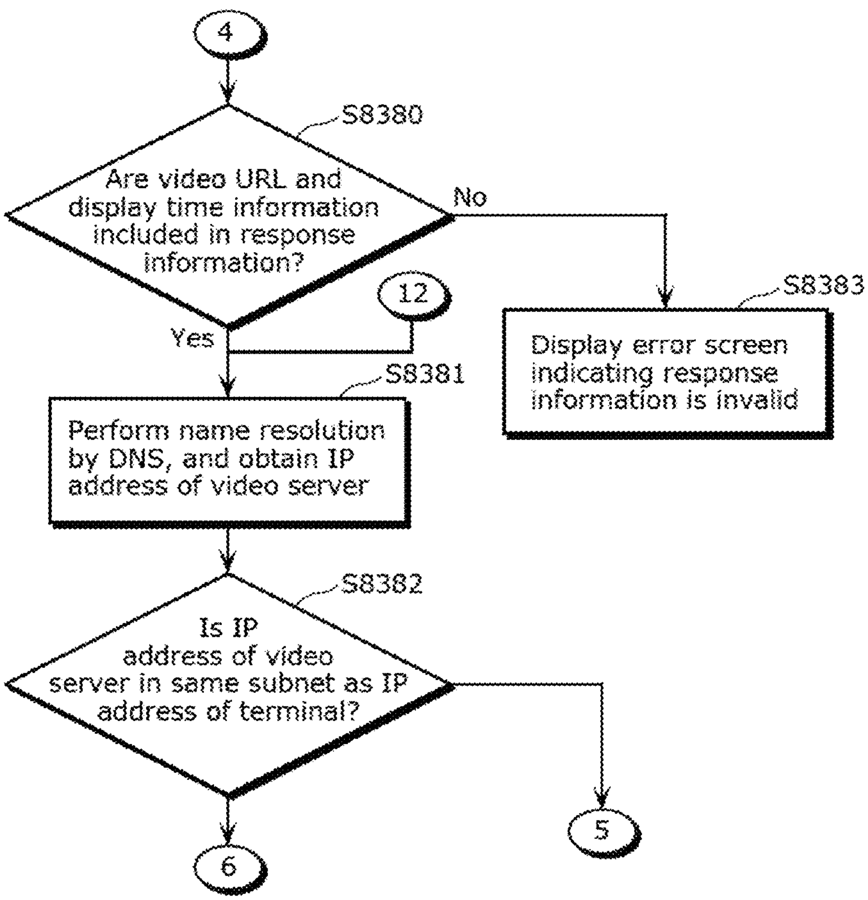

FIG. 410 is a flowchart of a URL get mode of the mobile AV terminal.

Figure 411:
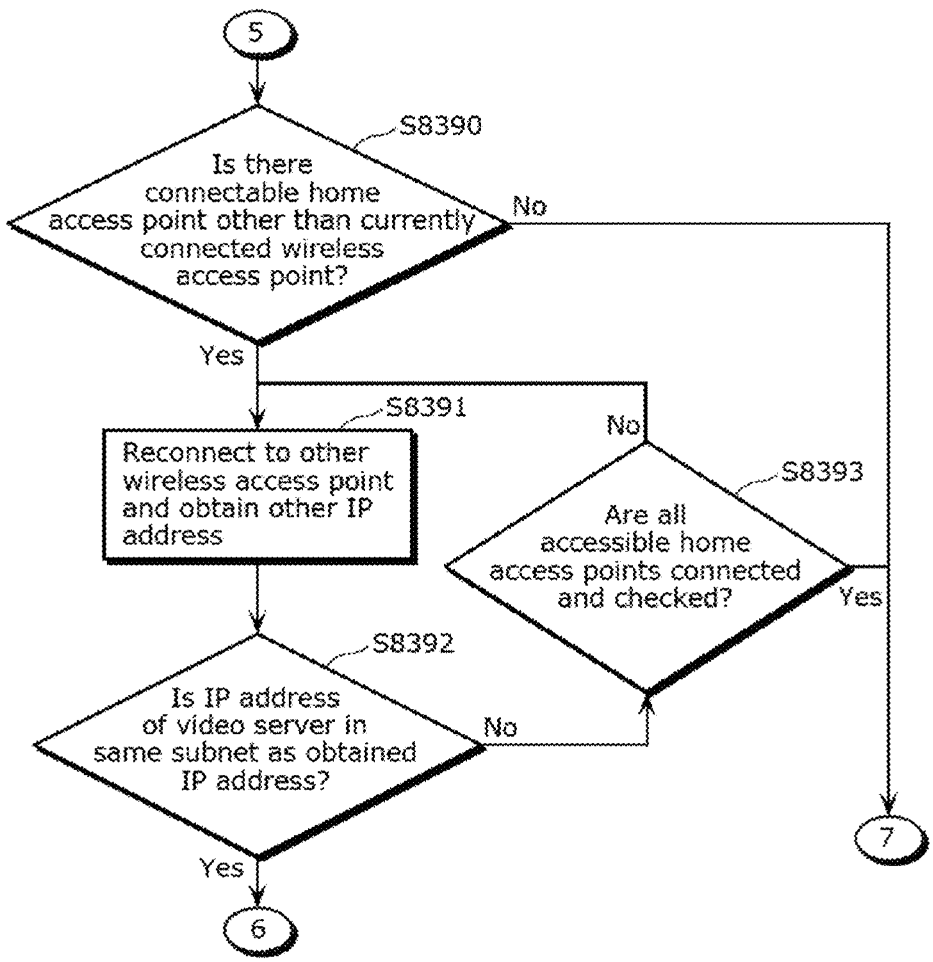

FIG. 411 is a flowchart of server position search by the mobile AV terminal.

Figure 412:
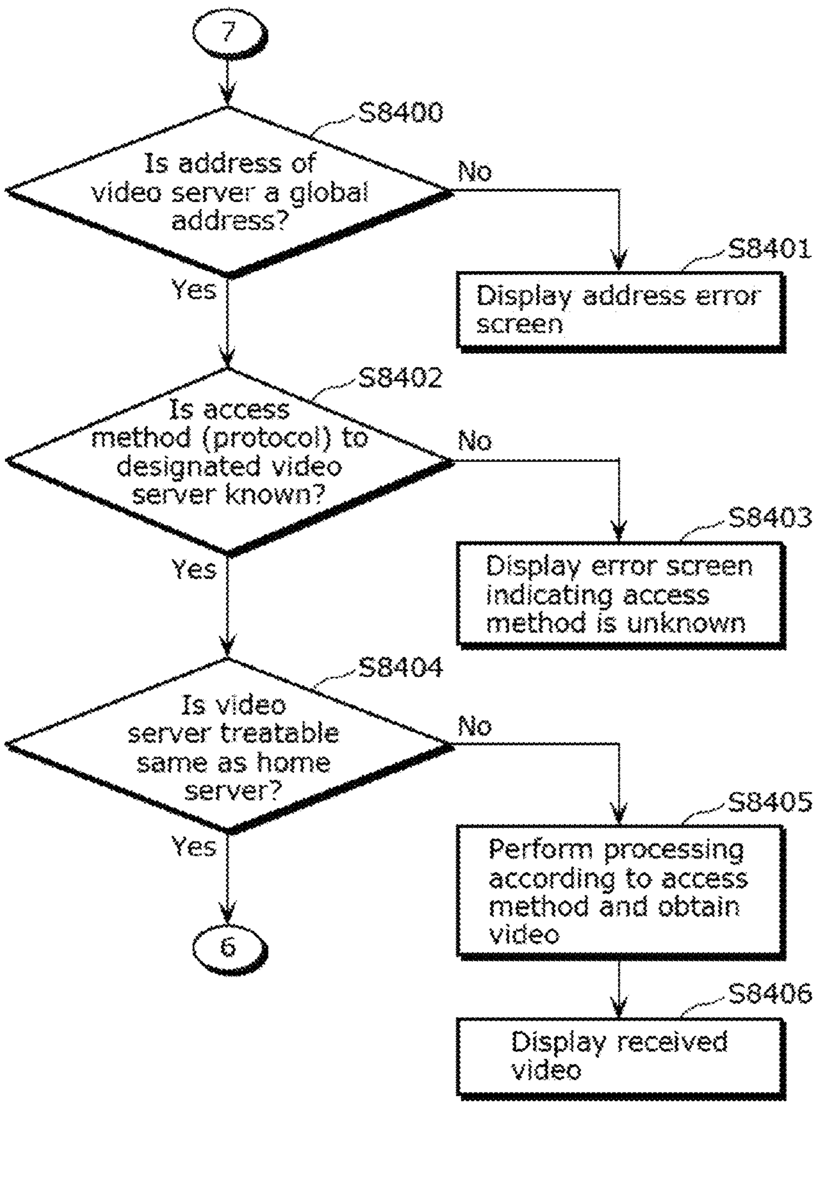

FIG. 412 is a flowchart of a mode in which the mobile AV terminal gets video from an external server.

Figure 413:
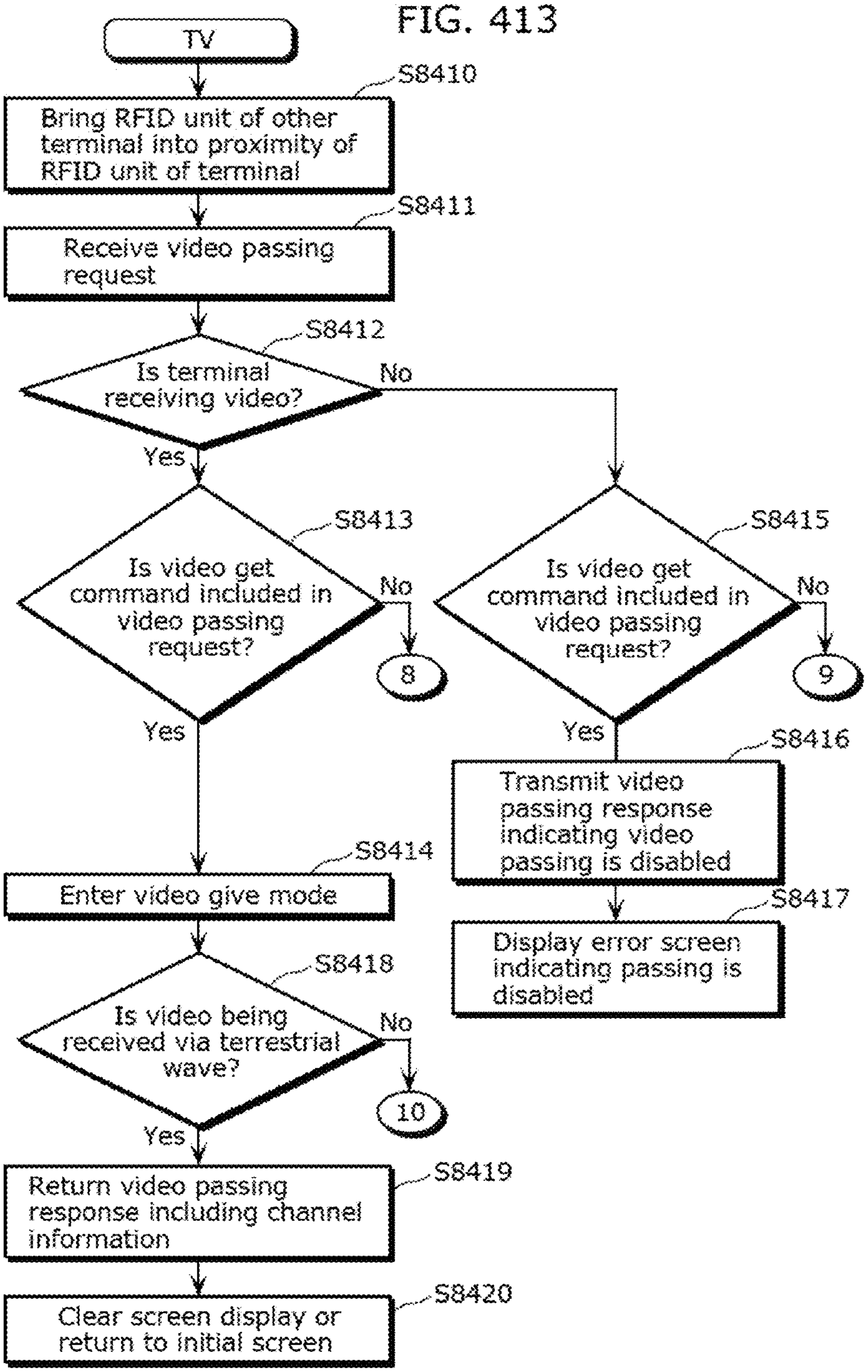

FIG. 413 is a basic flowchart of the TV.

Figure 414:
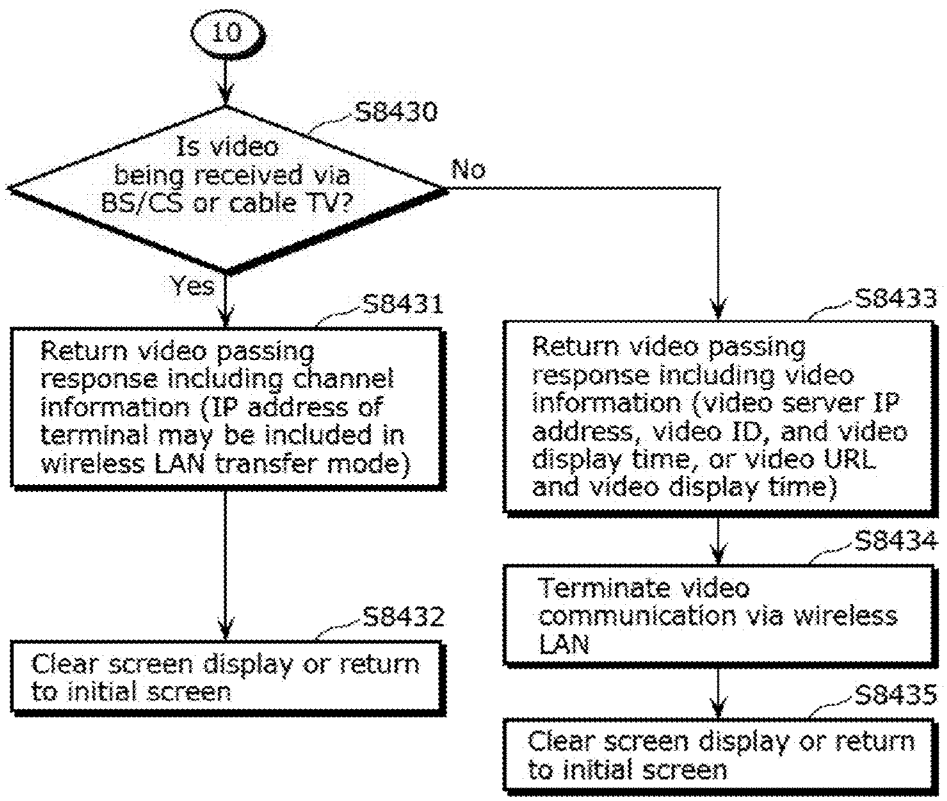

FIG. 414 is a flowchart of a give mode of the TV.

Figure 415:
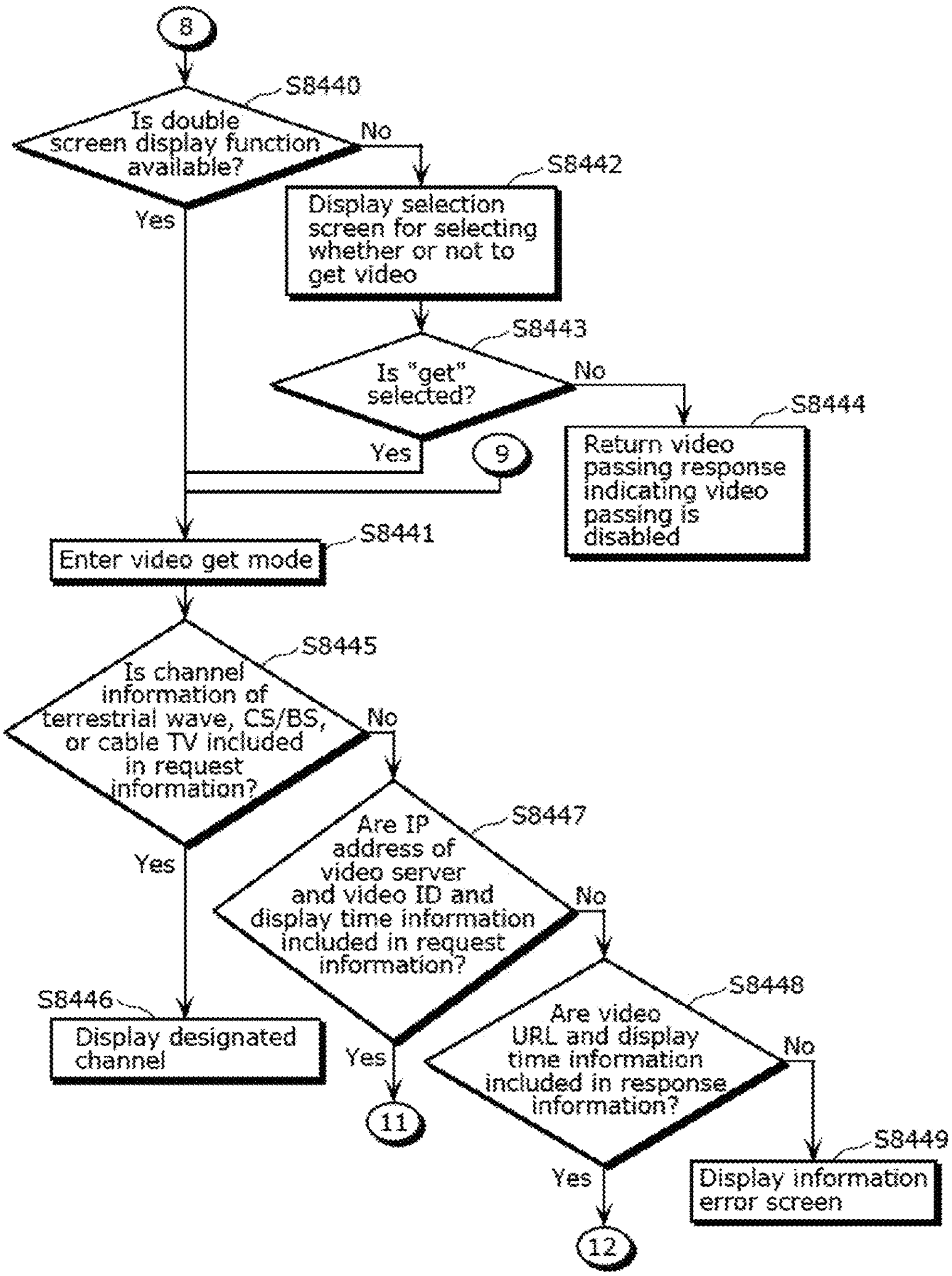

FIG. 415 is a flowchart of a get mode of the TV.

Figure 416:
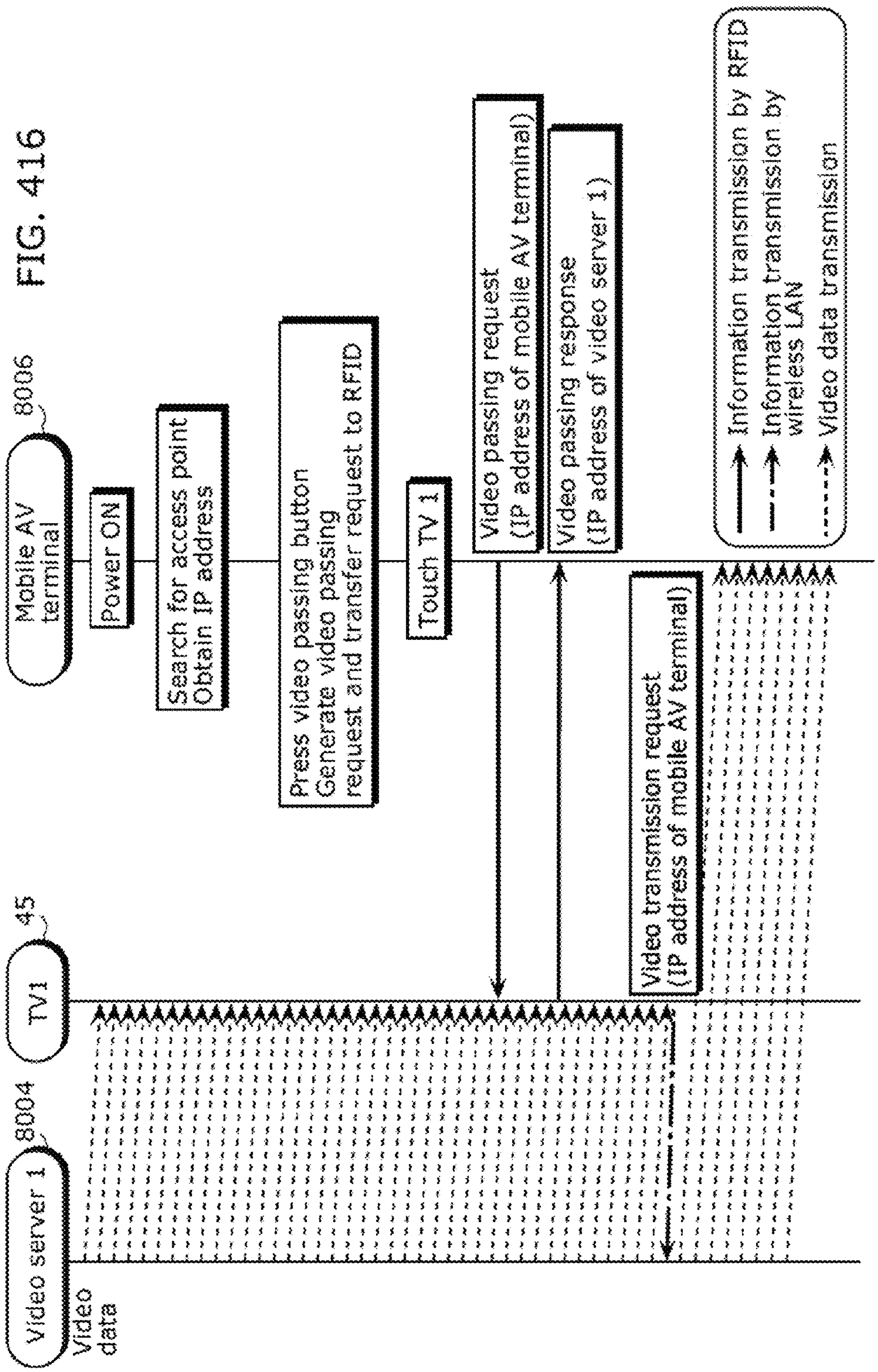

FIG. 416 is a sequence diagram in the case where the mobile AV terminal gets video (first half, control performed by give side).

Figure 417:
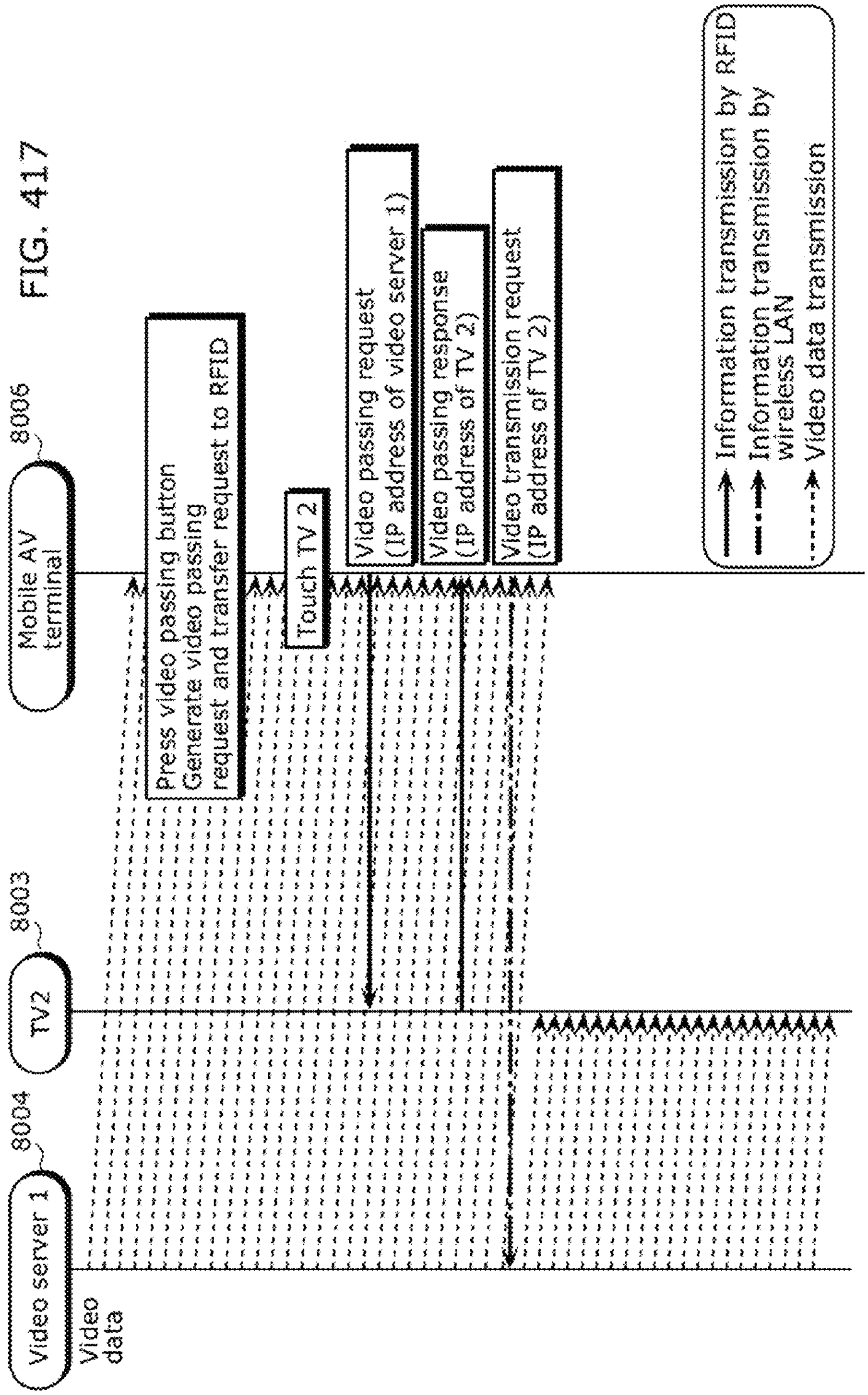

FIG. 417 is a sequence diagram in the case where the mobile AV terminal gives video (second half, control performed by give side).

Figure 418:
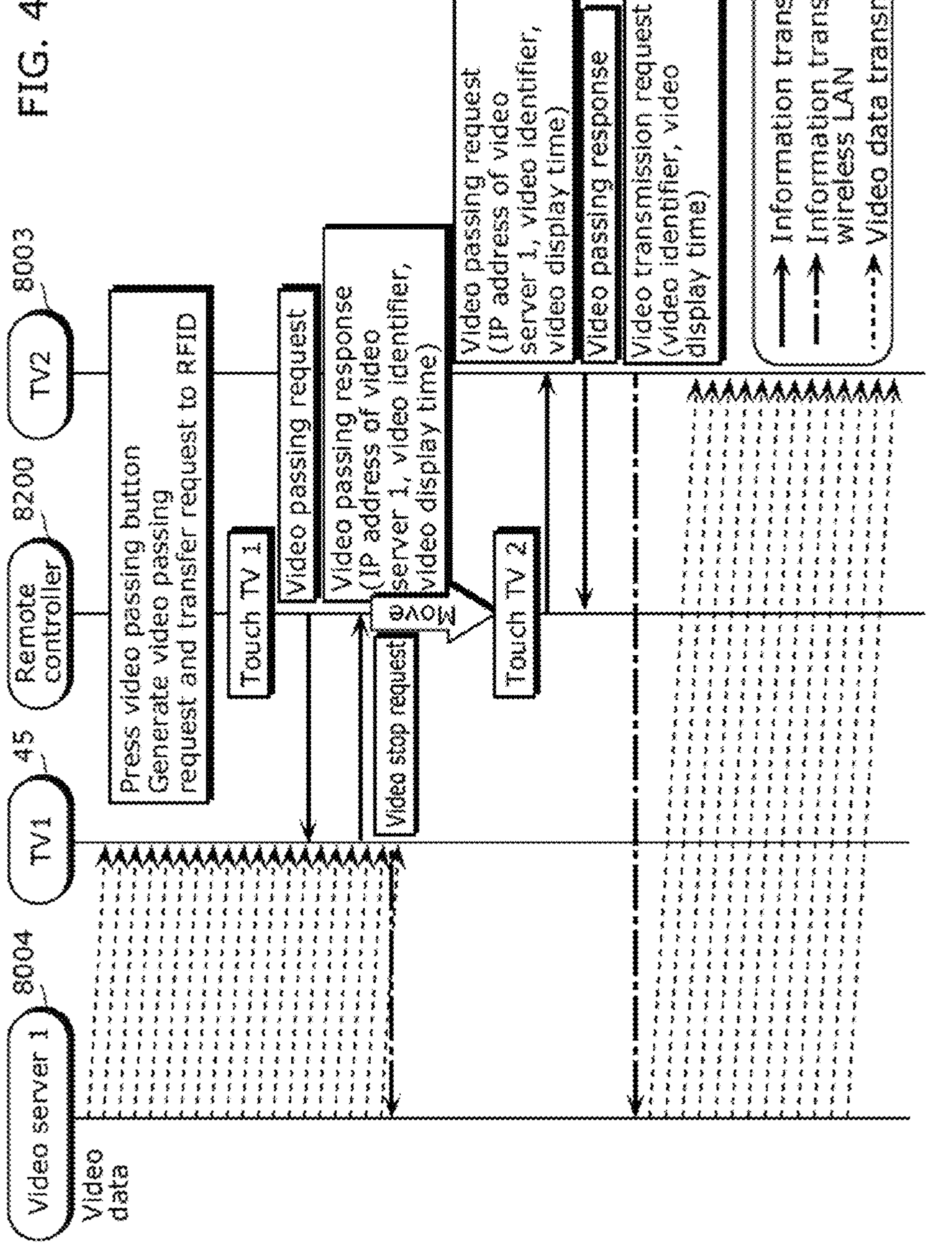

FIG. 418 is a sequence diagram in the case where passing is performed by a remote controller.

Figure 419:
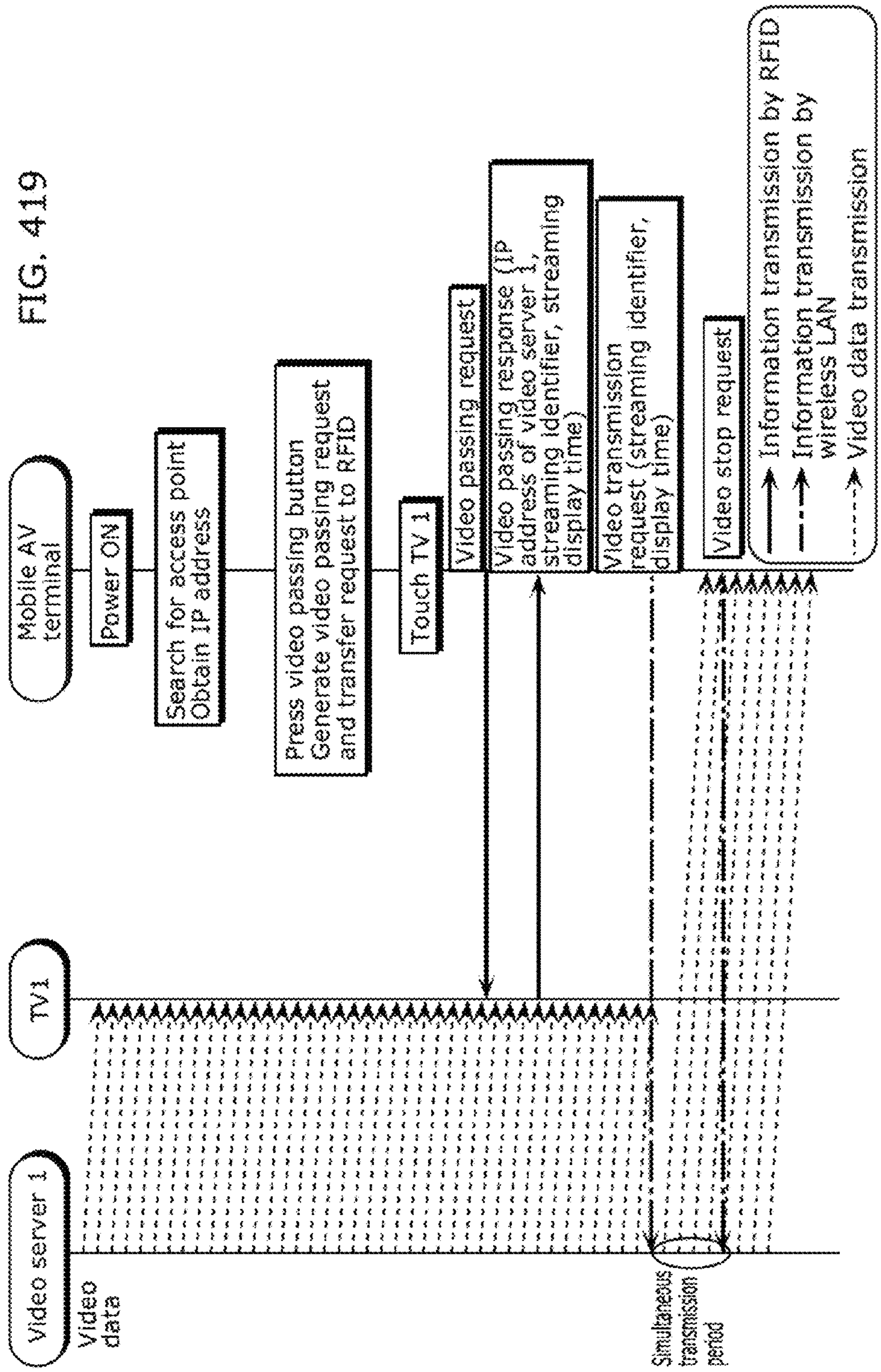

FIG. 419 is a sequence diagram in the case where a video server performs synchronous transmission.

Figure 420:
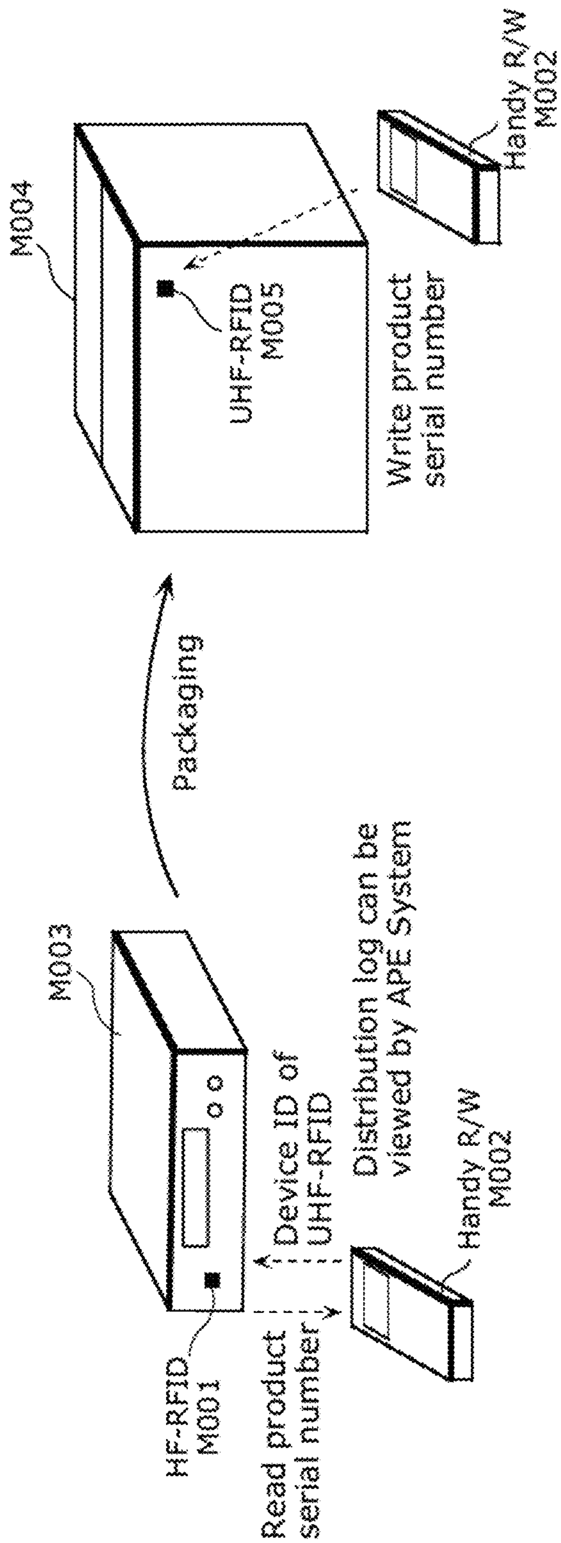

FIG. 420 is a schematic diagram illustrating processing of HF-RFID and UHF-RFID upon apparatus factory shipment.

Figure 421:
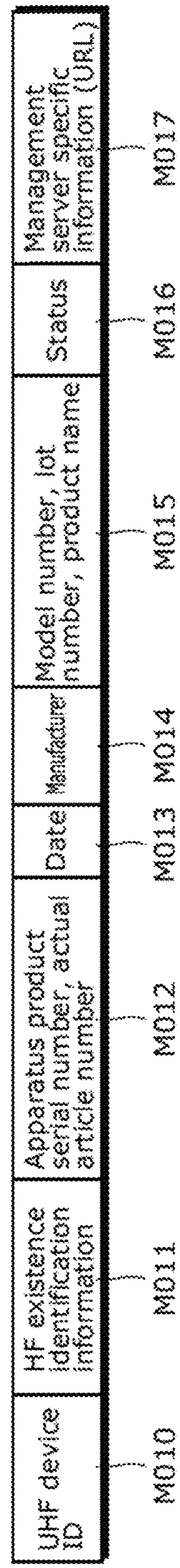

FIG. 421 is a schematic diagram illustrating a recording format of a memory accessible from a UHF-RFID tag M005.

Figure 422:
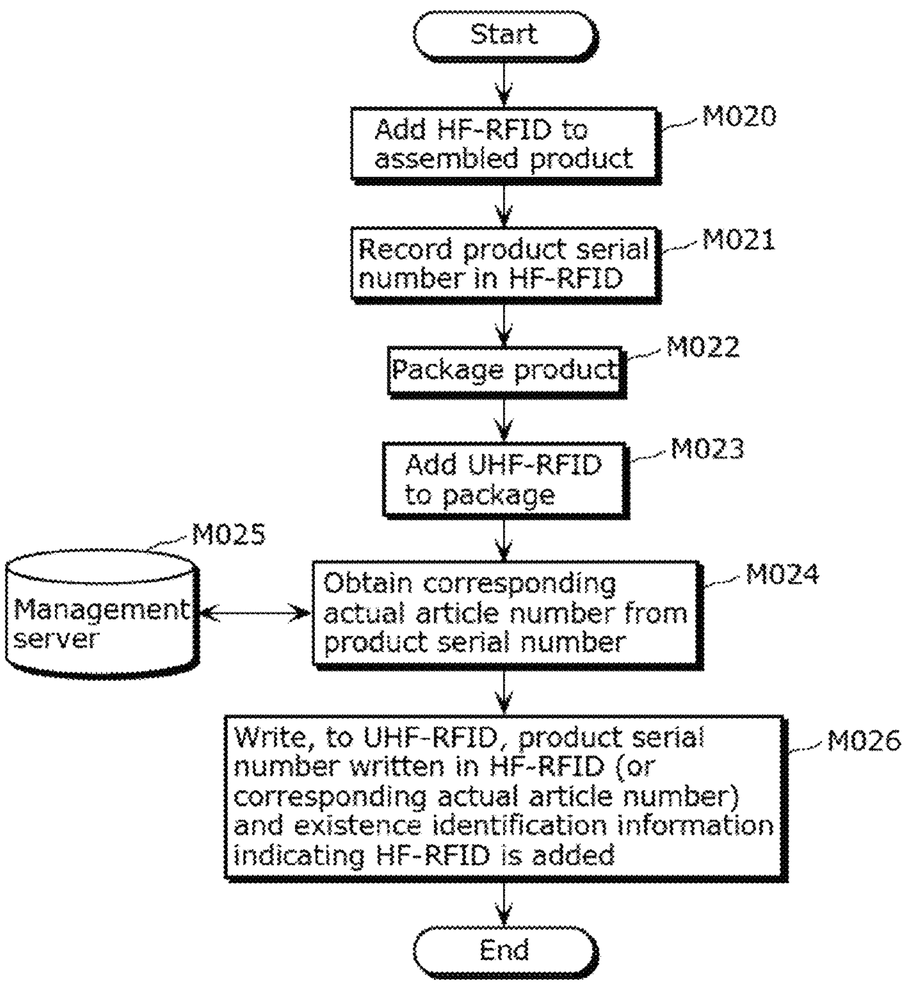

FIG. 422 is a flowchart of a flow of processing of copying a product serial number and the like from HF-RFID to UHF-RFID upon factory shipment of an apparatus M003.

Figure 423:
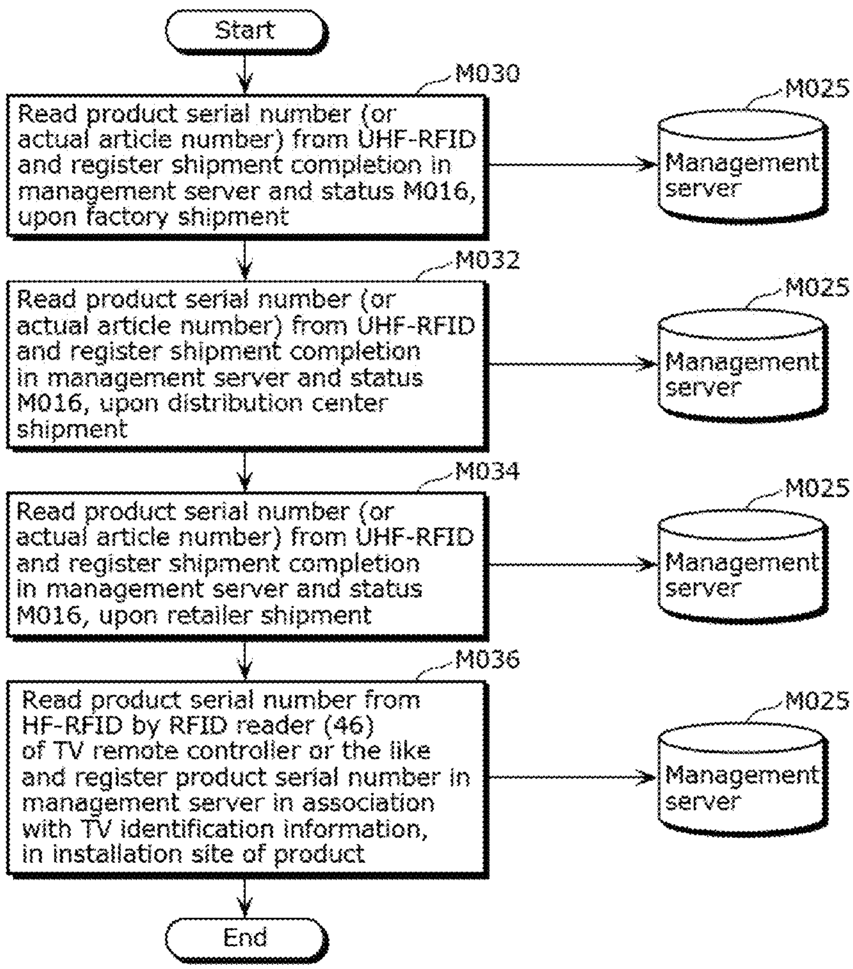

FIG. 423 is a flowchart of a flow of processing in a distribution process of the apparatus M003.

Figure 424:
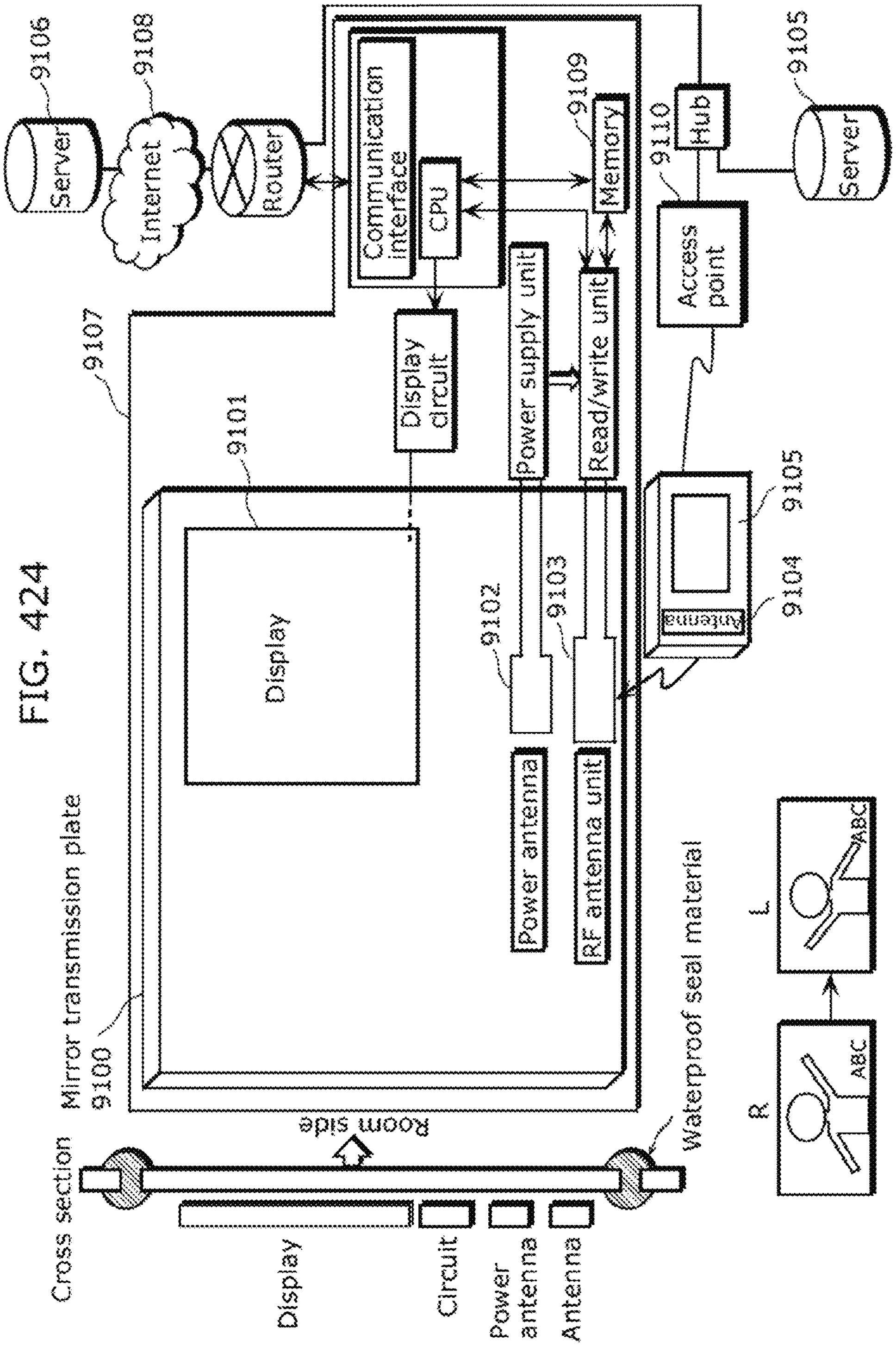

FIG. 424 is a block diagram illustrating a structure of an entire system.

Figure 425:
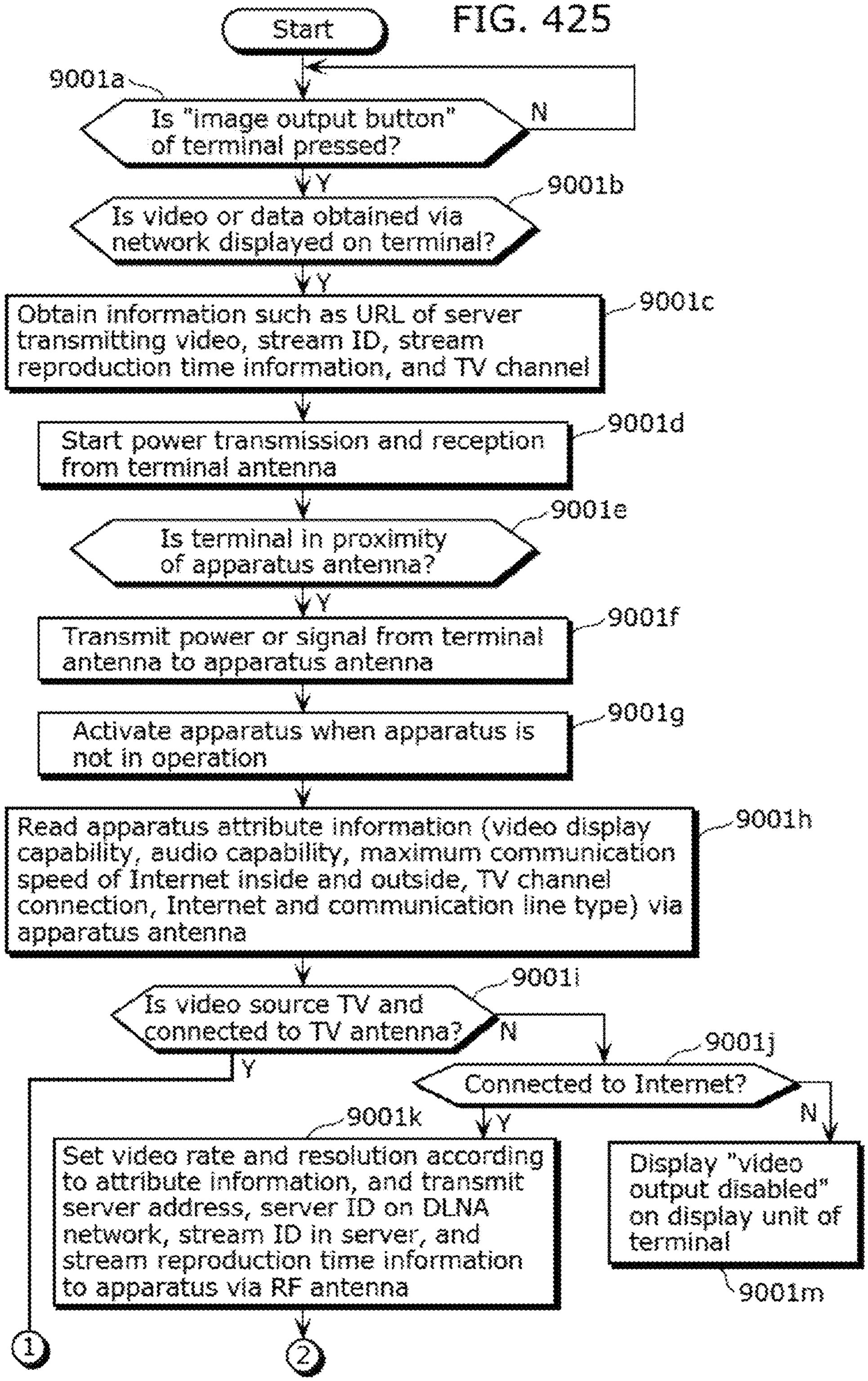

FIG. 425 is a flowchart (first half) of a procedure of moving video to a display of a mirror.

Figure 426:
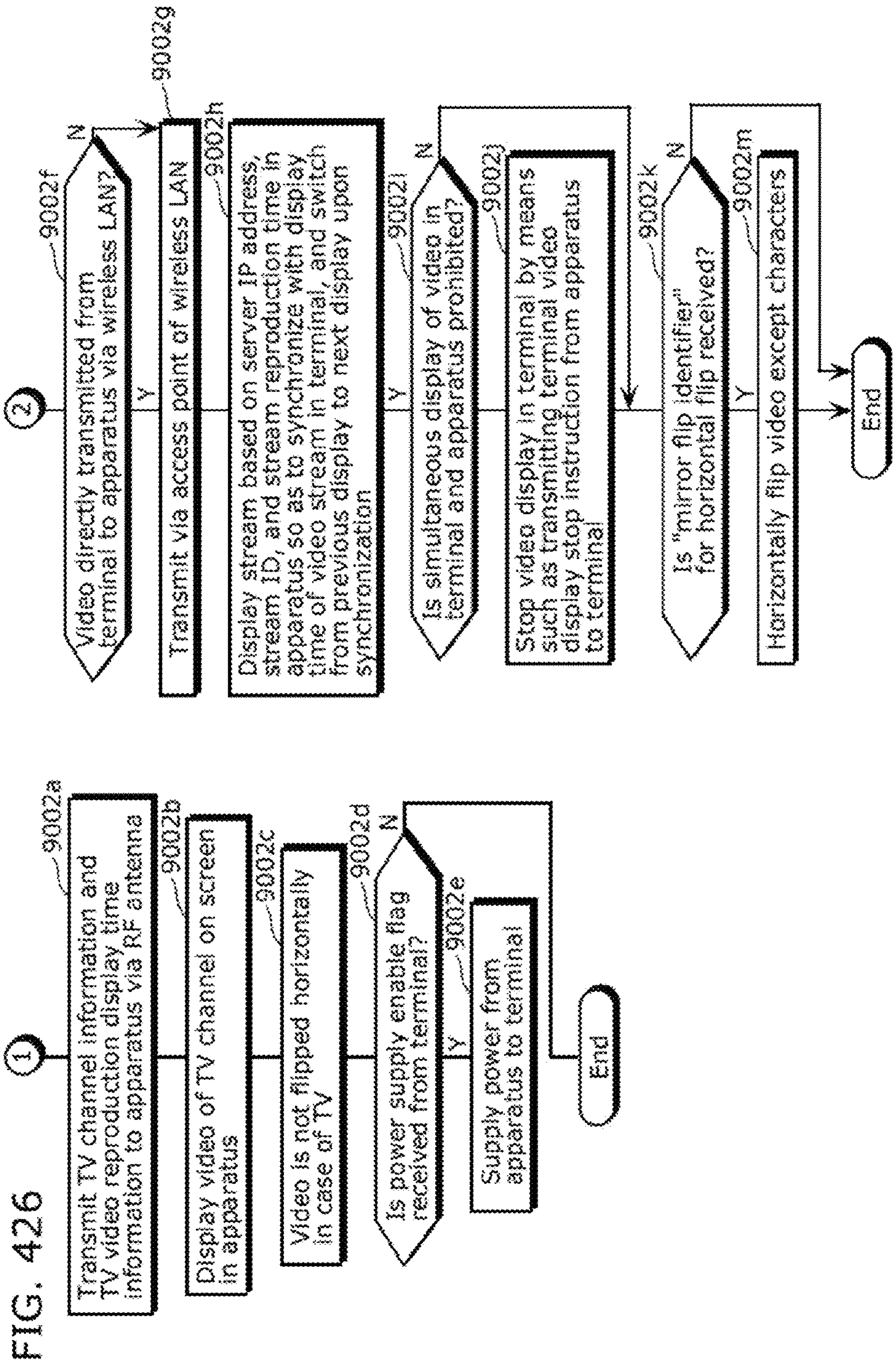

FIG. 426 is a flowchart (second half) of the procedure of moving video to the display of the mirror.

Figure 427:
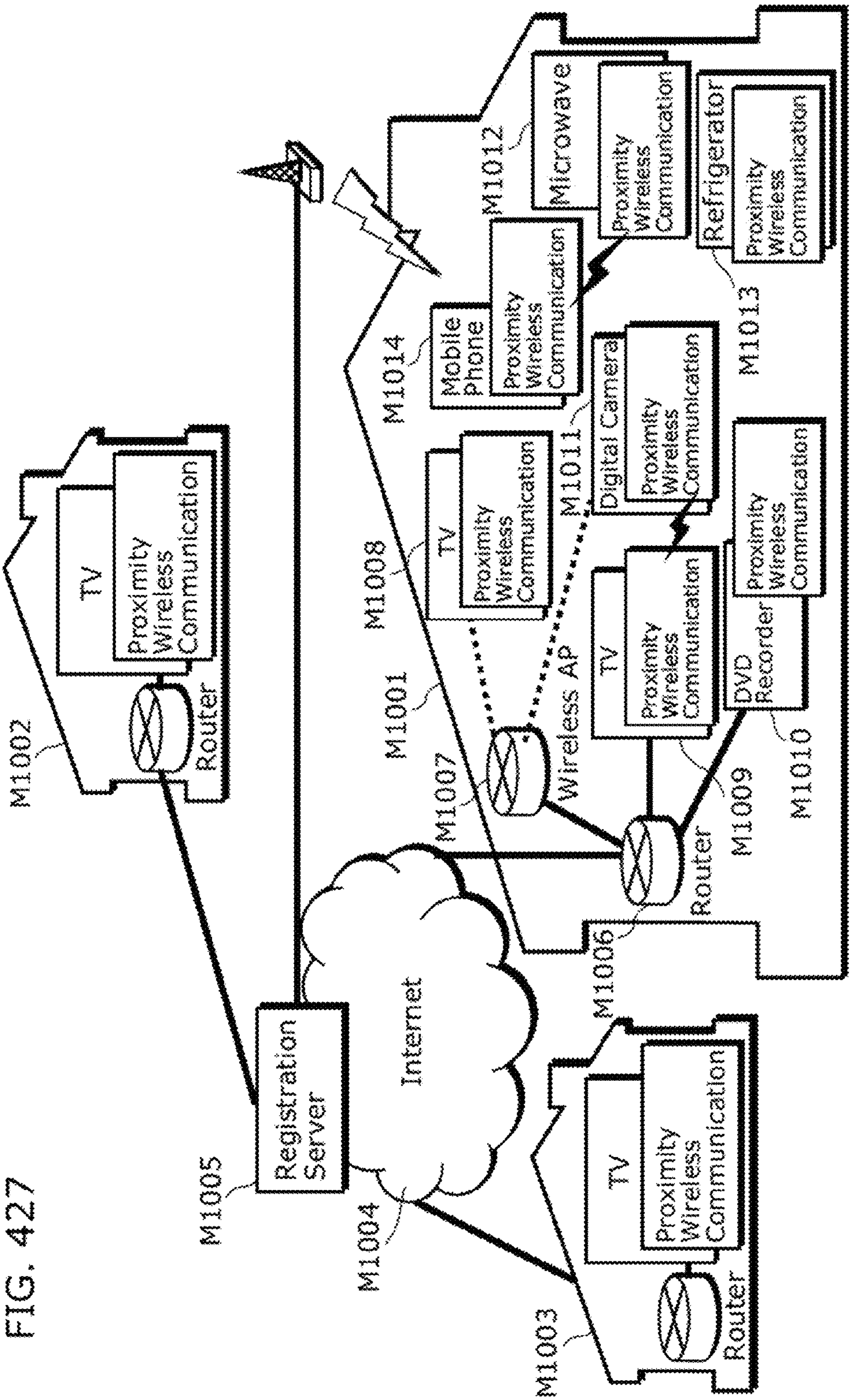

FIG. 427 is a diagram of a network environment in home ID registration.

Figure 428:
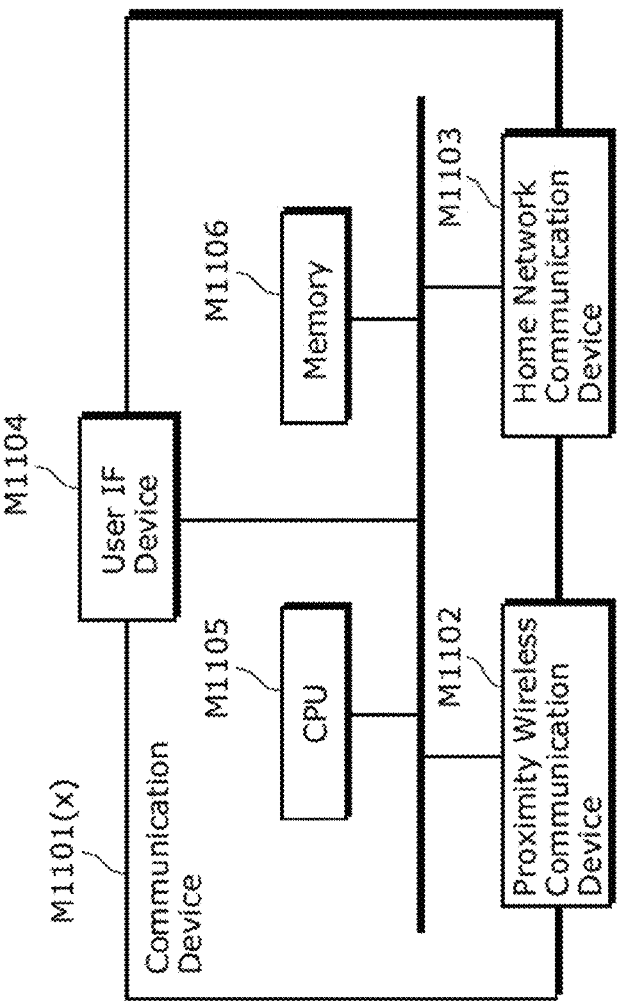

FIG. 428 is a hardware diagram of the communication device in the home ID registration.

Figure 429:
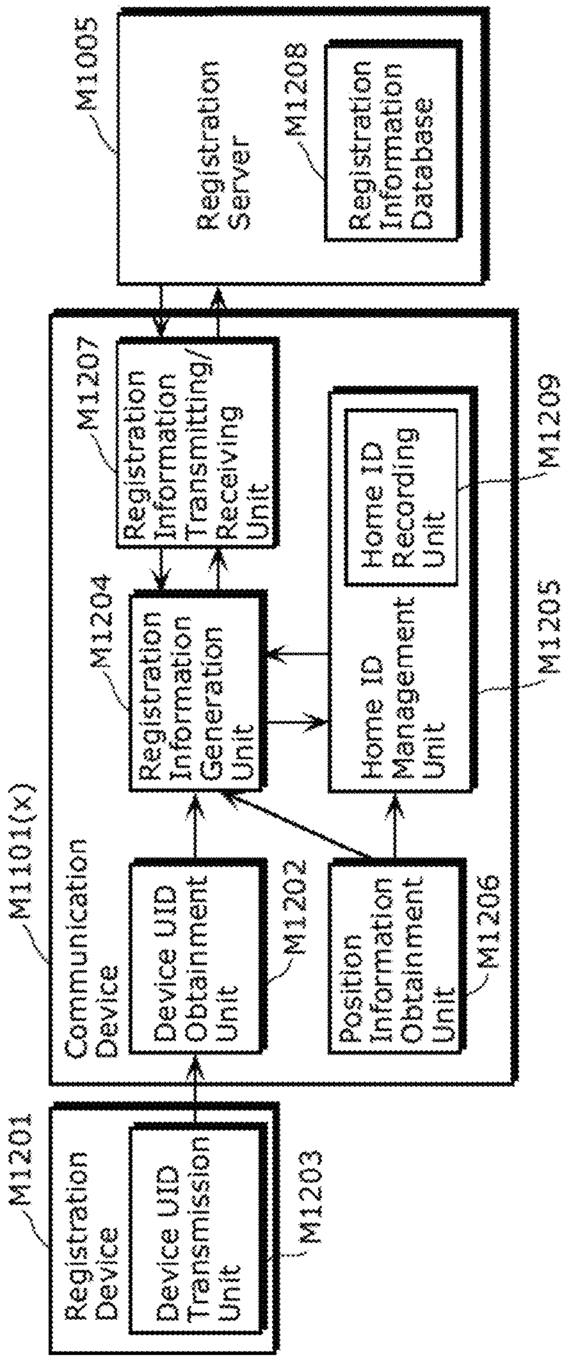

FIG. 429 is a functional block diagram of the communication device in the home ID registration.

Figure 430:
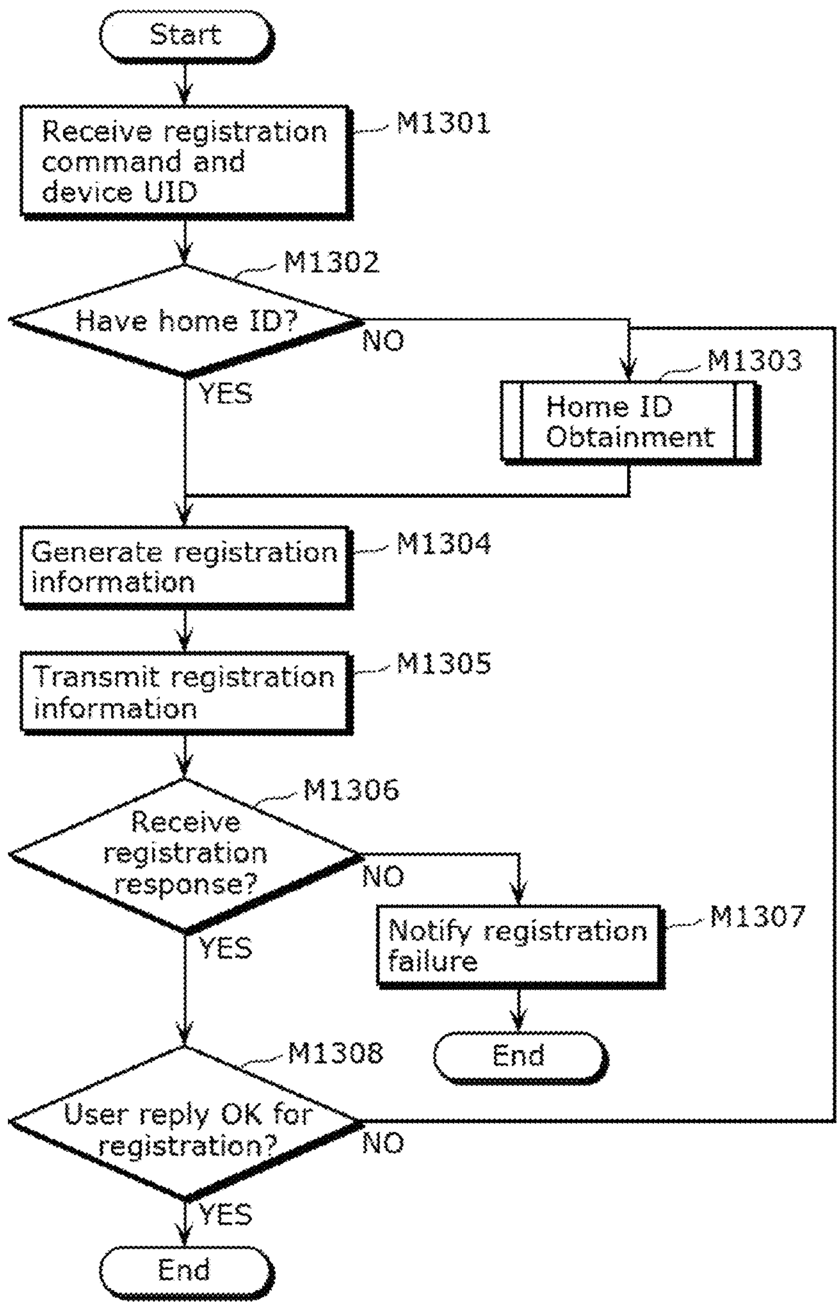

FIG. 430 is a flowchart of the home ID registration.

Figure 431:
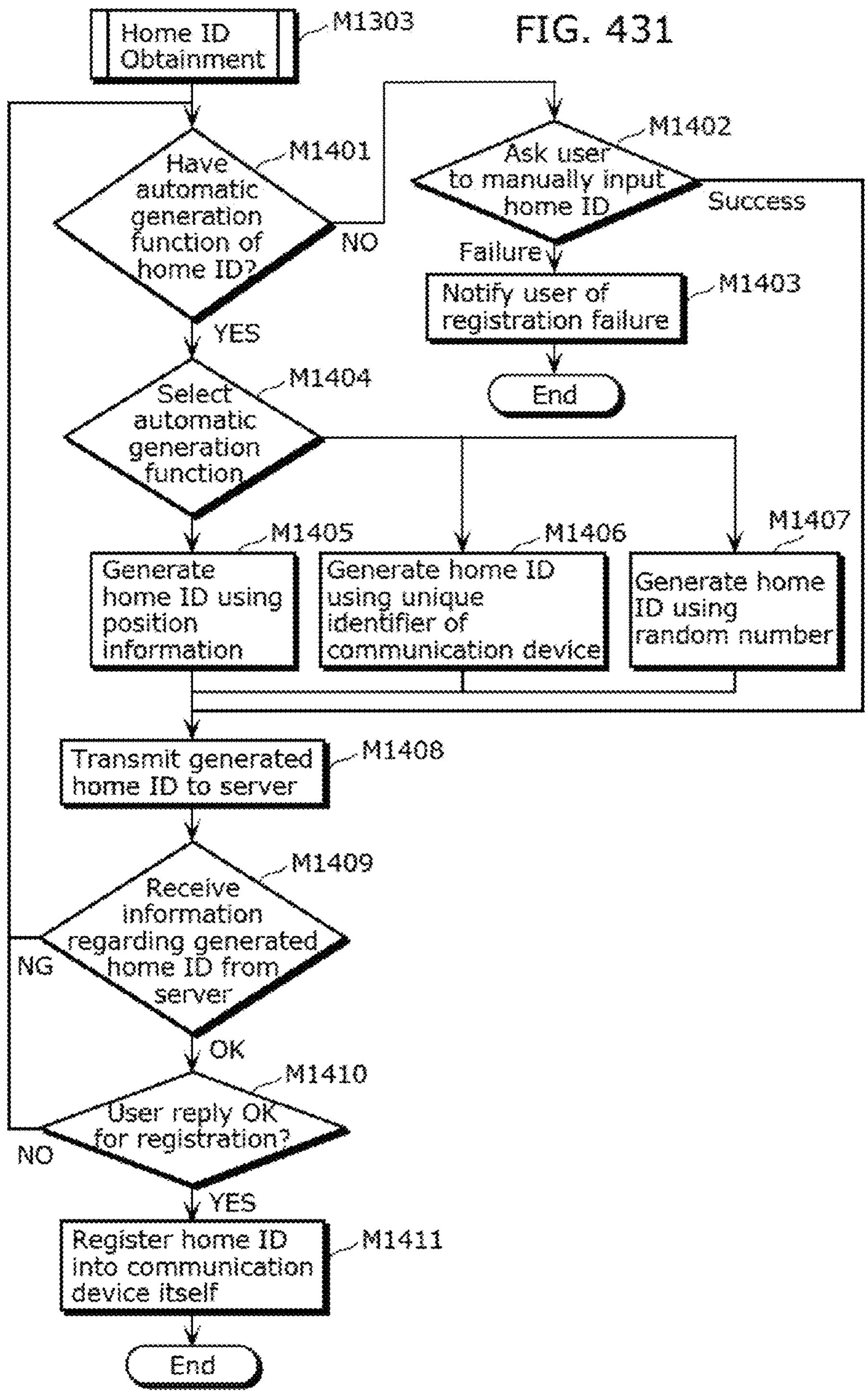

FIG. 431 is a flowchart of home ID obtainment.

Figure 432:
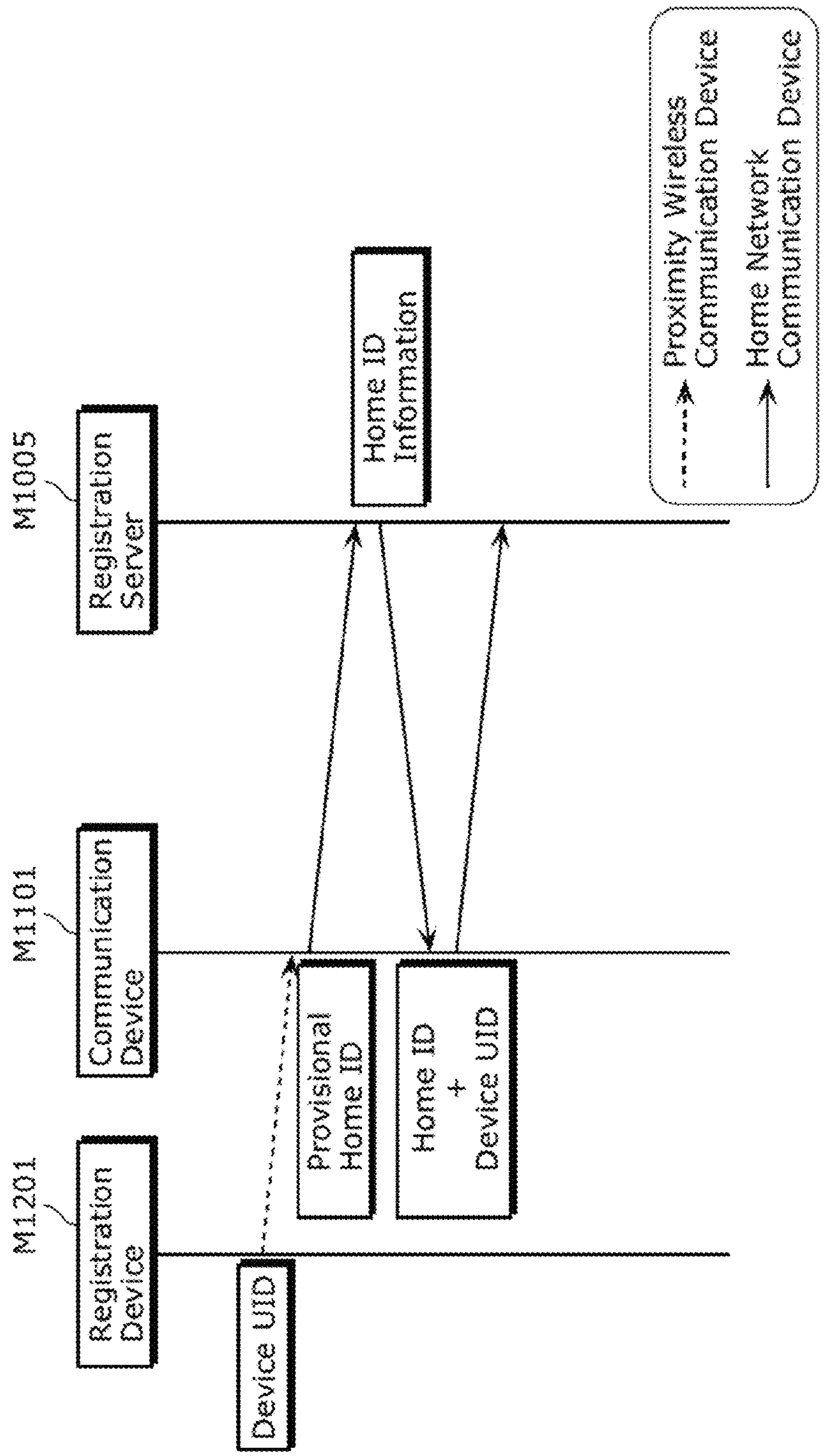

FIG. 432 is a sequence diagram of the home ID registration.

Figure 433:
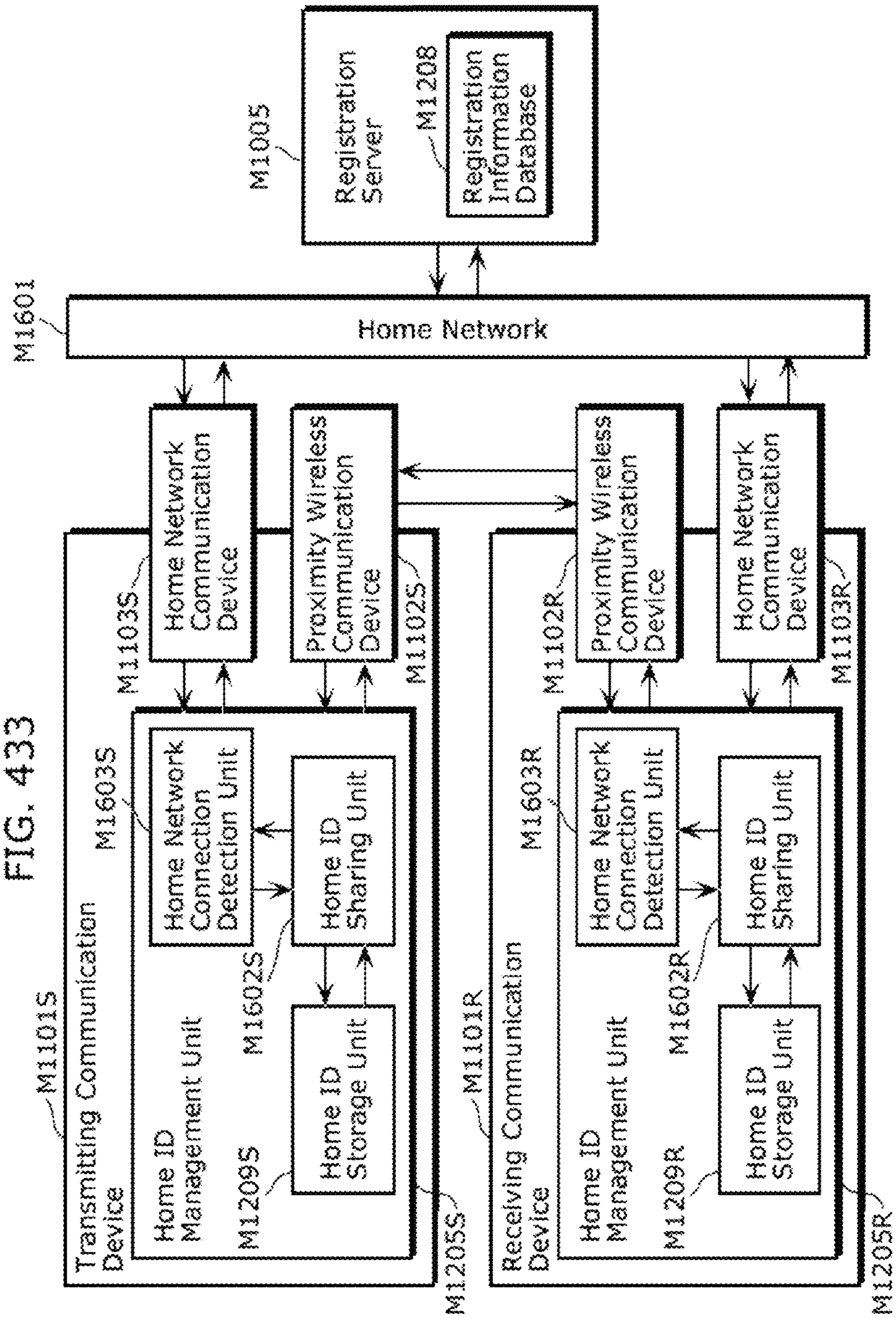

FIG. 433 is a functional block diagram of communication devices in home ID sharing.

Figure 434:
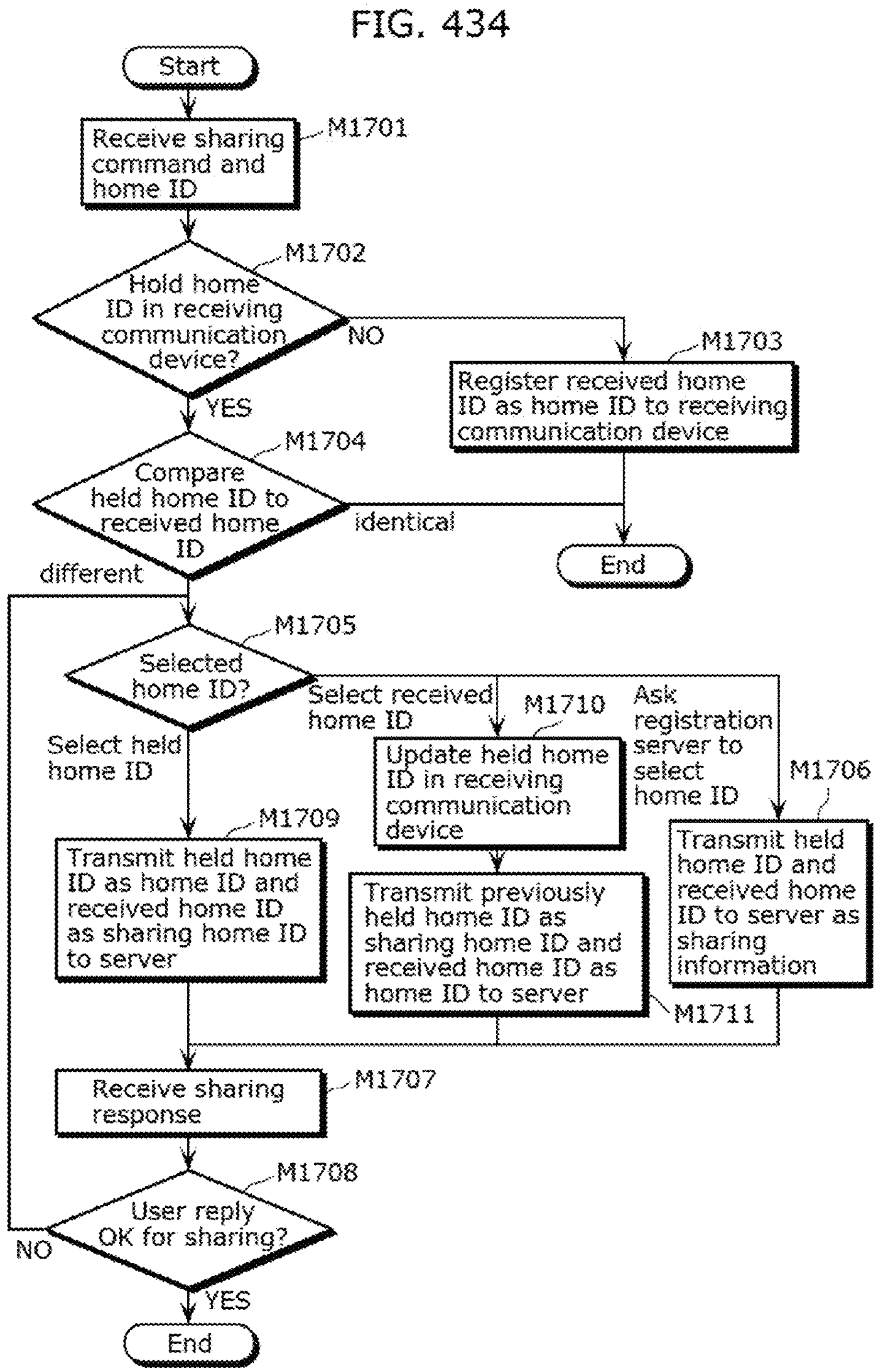

FIG. 434 is a flowchart of processing performed by a receiving communication device in the home ID sharing (using proximity wireless communication).

Figure 435:
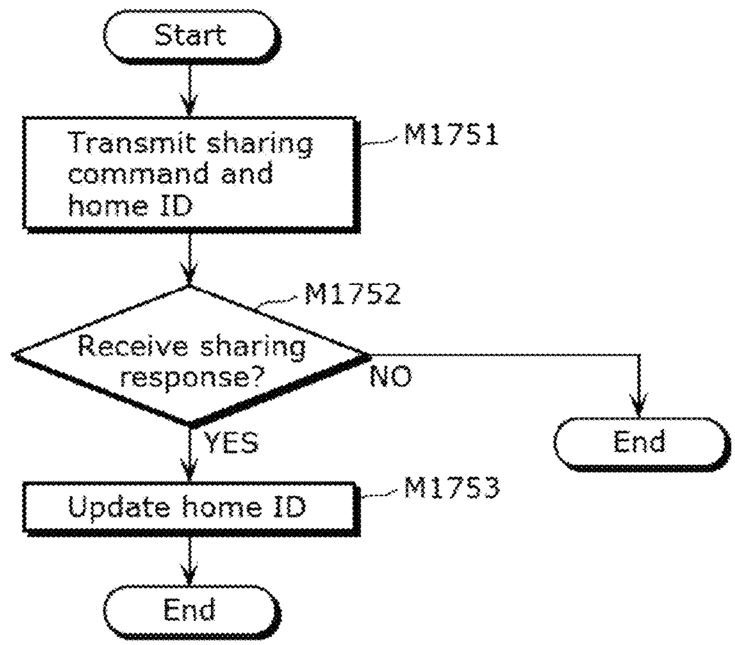

FIG. 435 is a flowchart of processing performed by a transmitting communication device in the home ID sharing (using proximity wireless communication).

Figure 436:
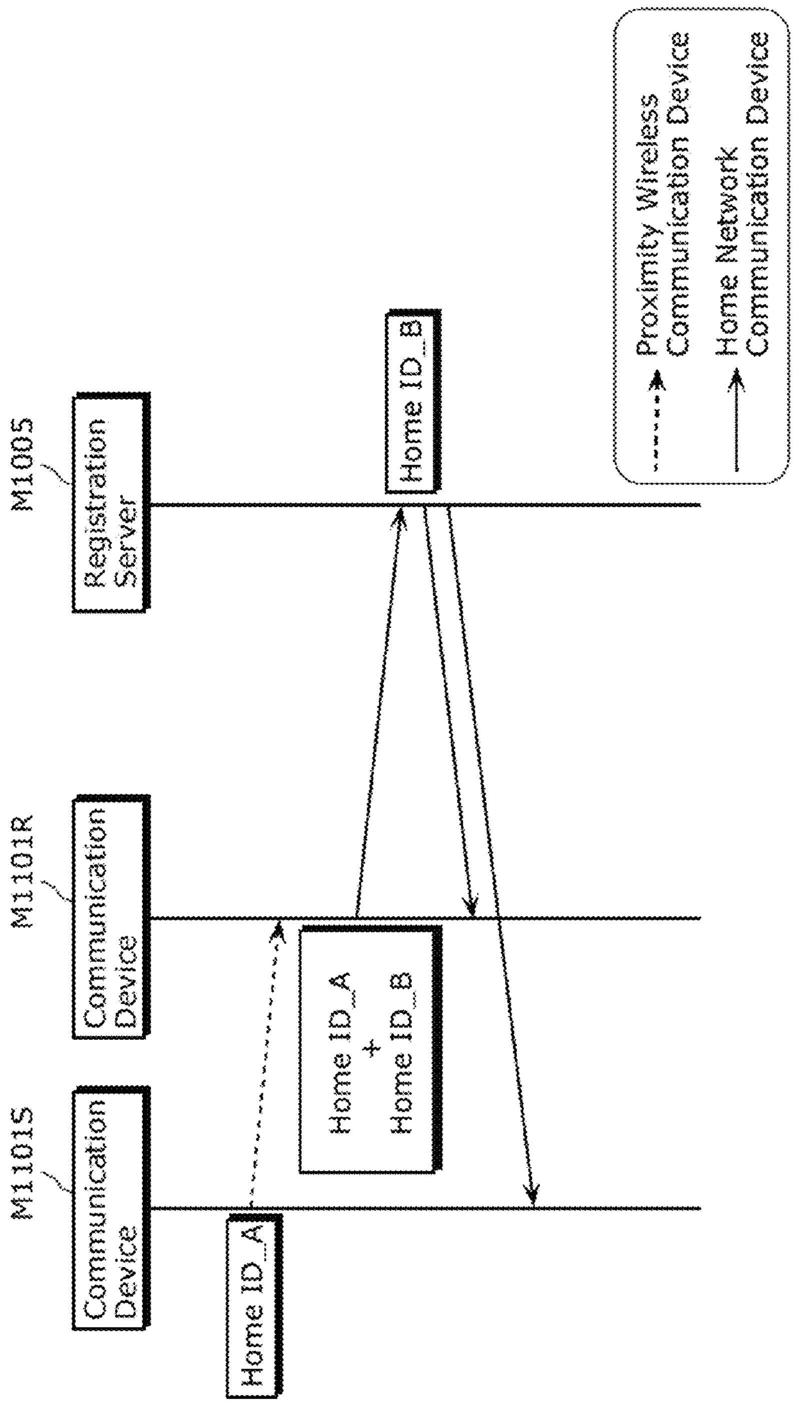

FIG. 436 is a sequence diagram of the home ID sharing (using proximity wireless communication).

Figure 437:
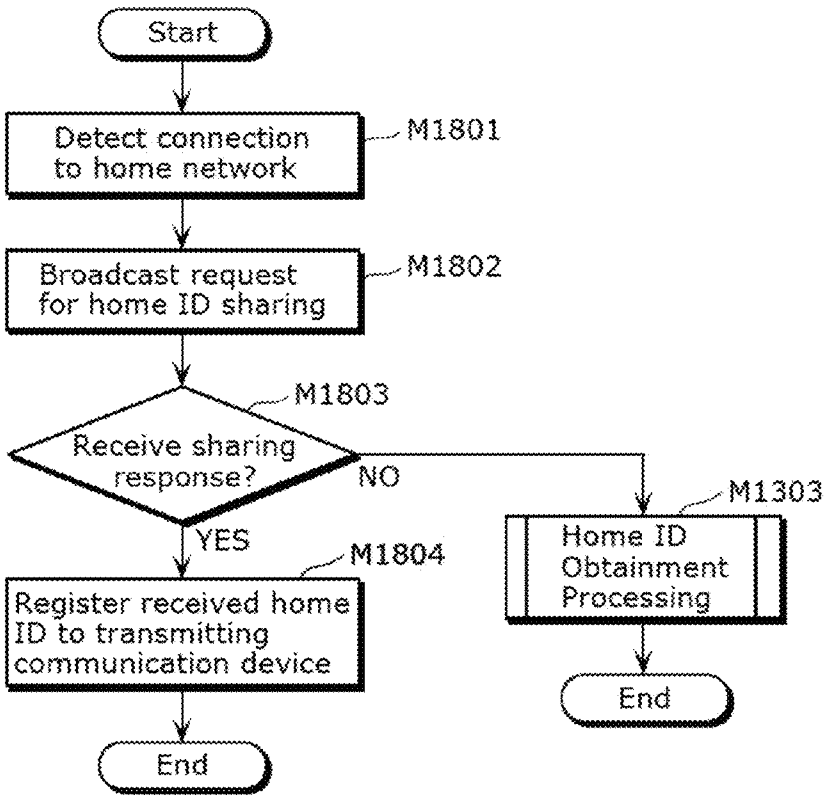

FIG. 437 is a flowchart of processing performed by the receiving communication device in the home ID sharing (using a home network device).

Figure 438:
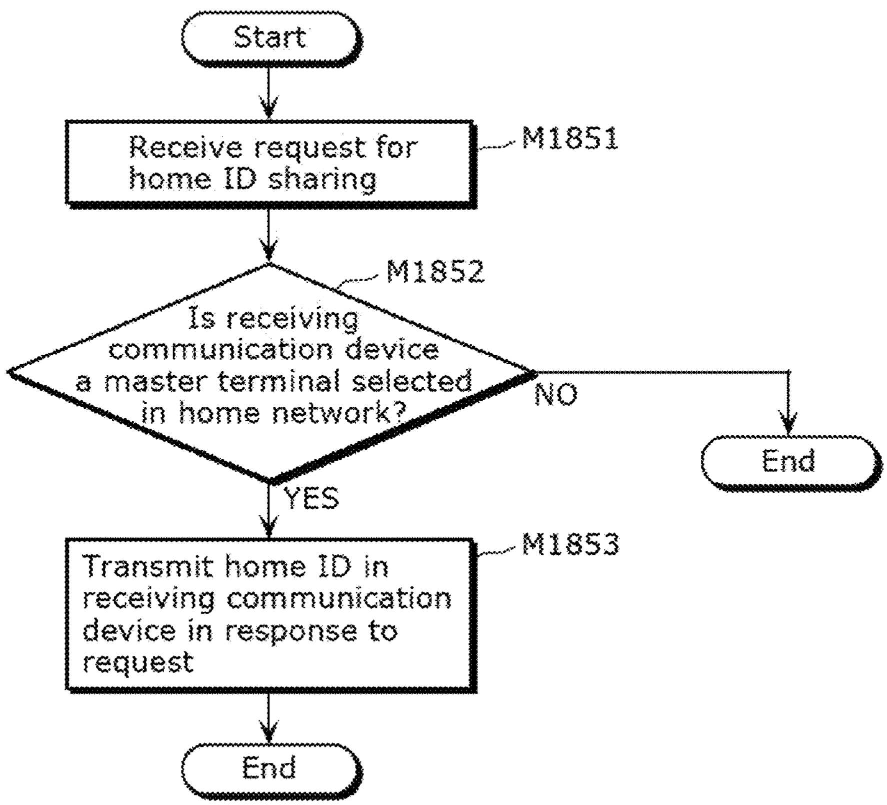

FIG. 438 is a flowchart of processing performed by the transmitting communication device in the home ID sharing (using the home network device).

Figure 439:
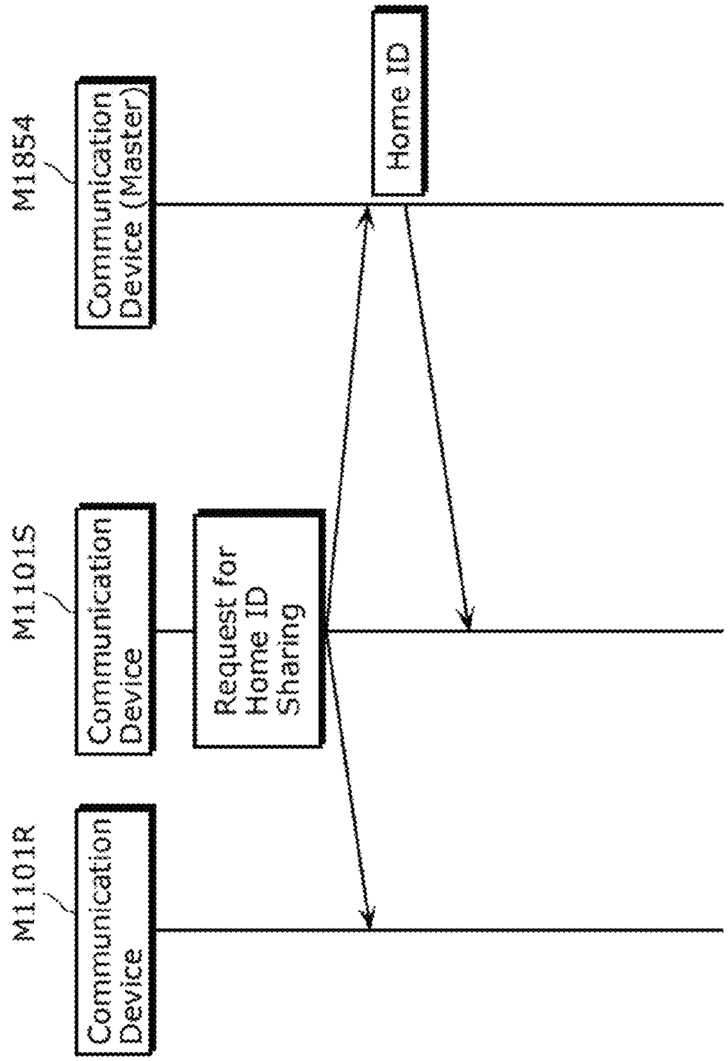

FIG. 439 is a sequence diagram of the home ID sharing (using the home network device).

Figure 440:
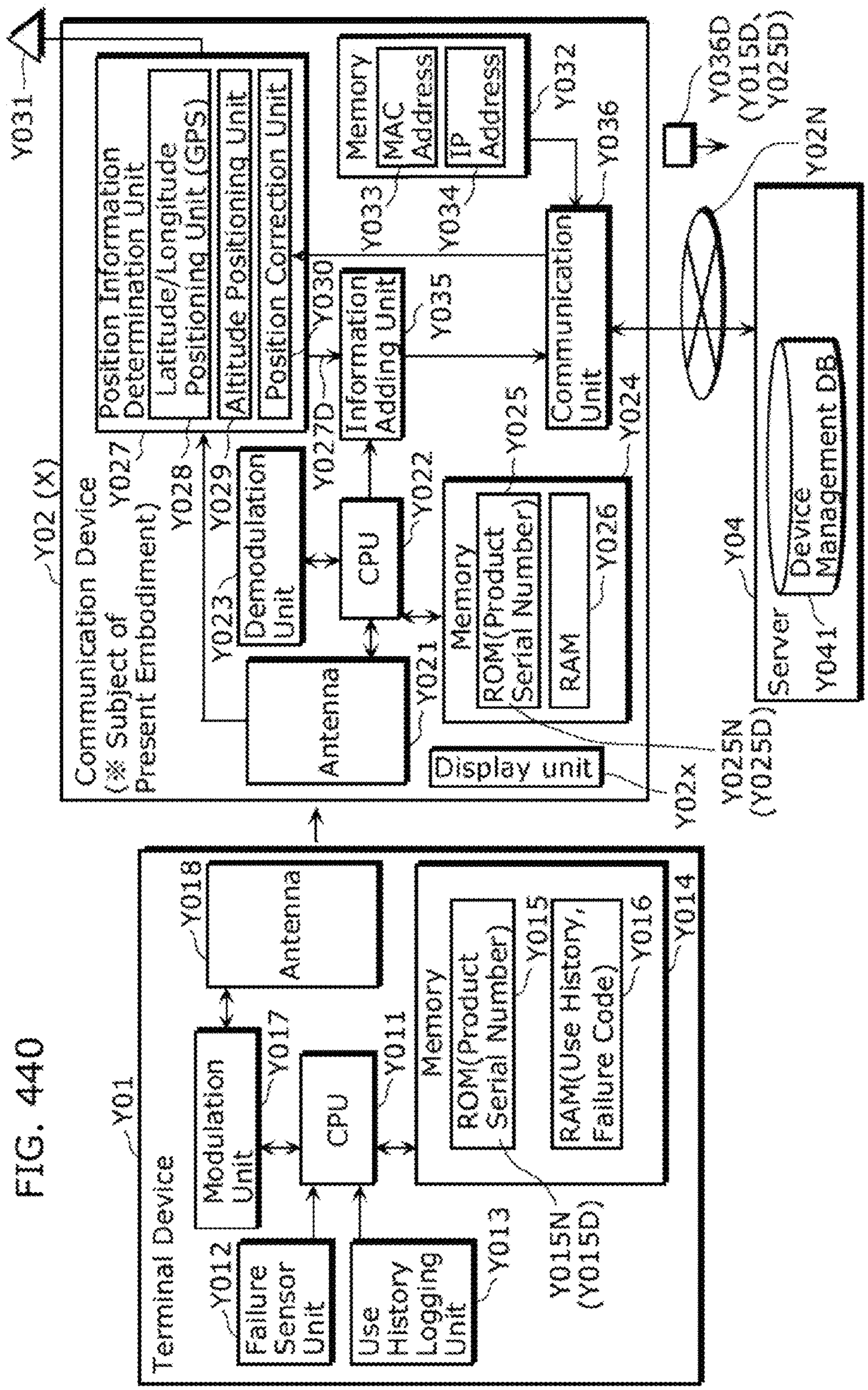

FIG. 440 is a block diagram of a device management system according to Embodiment B3.

Figure 441:
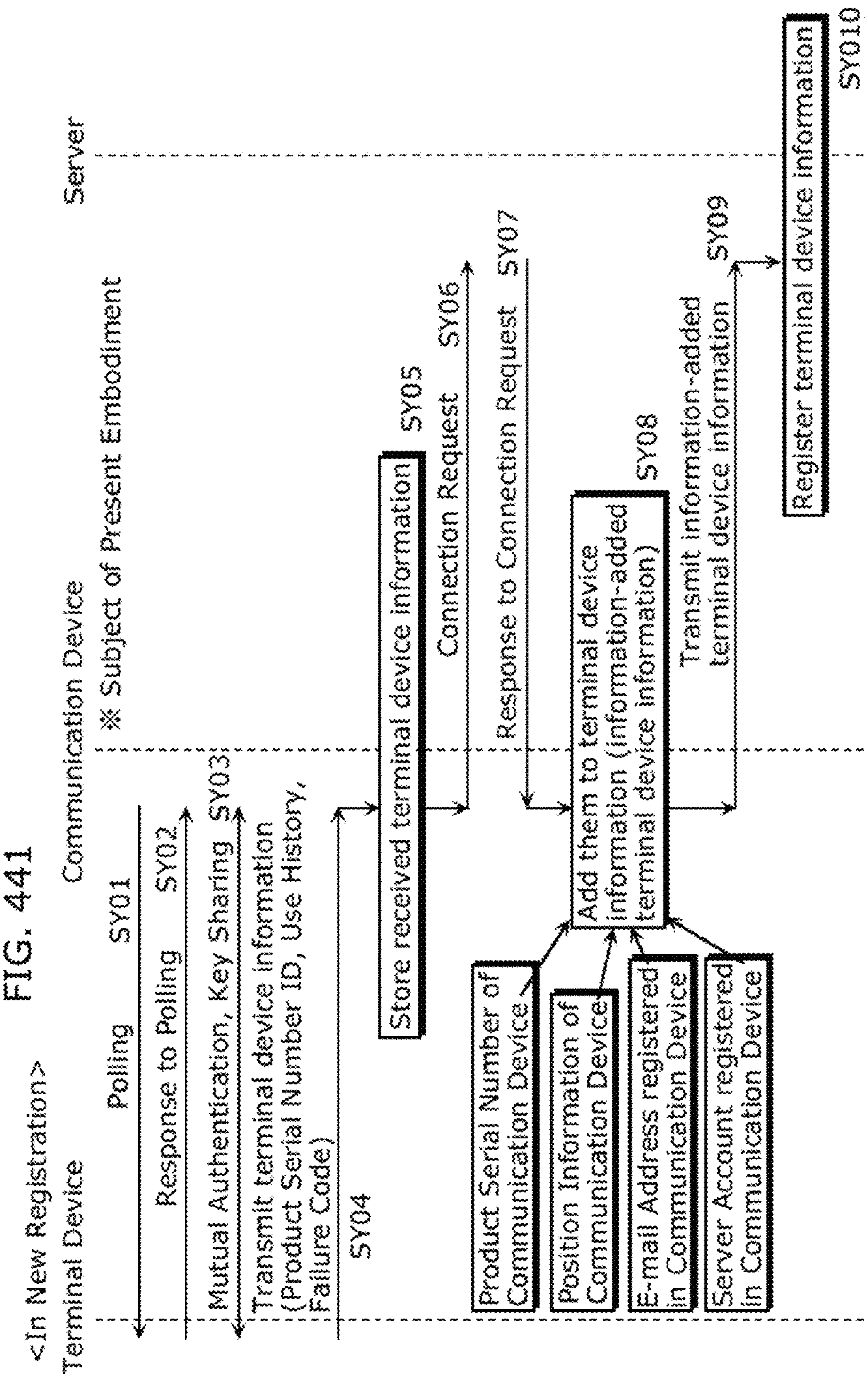

FIG. 441 is a sequence diagram of the device management system according to Embodiment B3.

Figure 442:
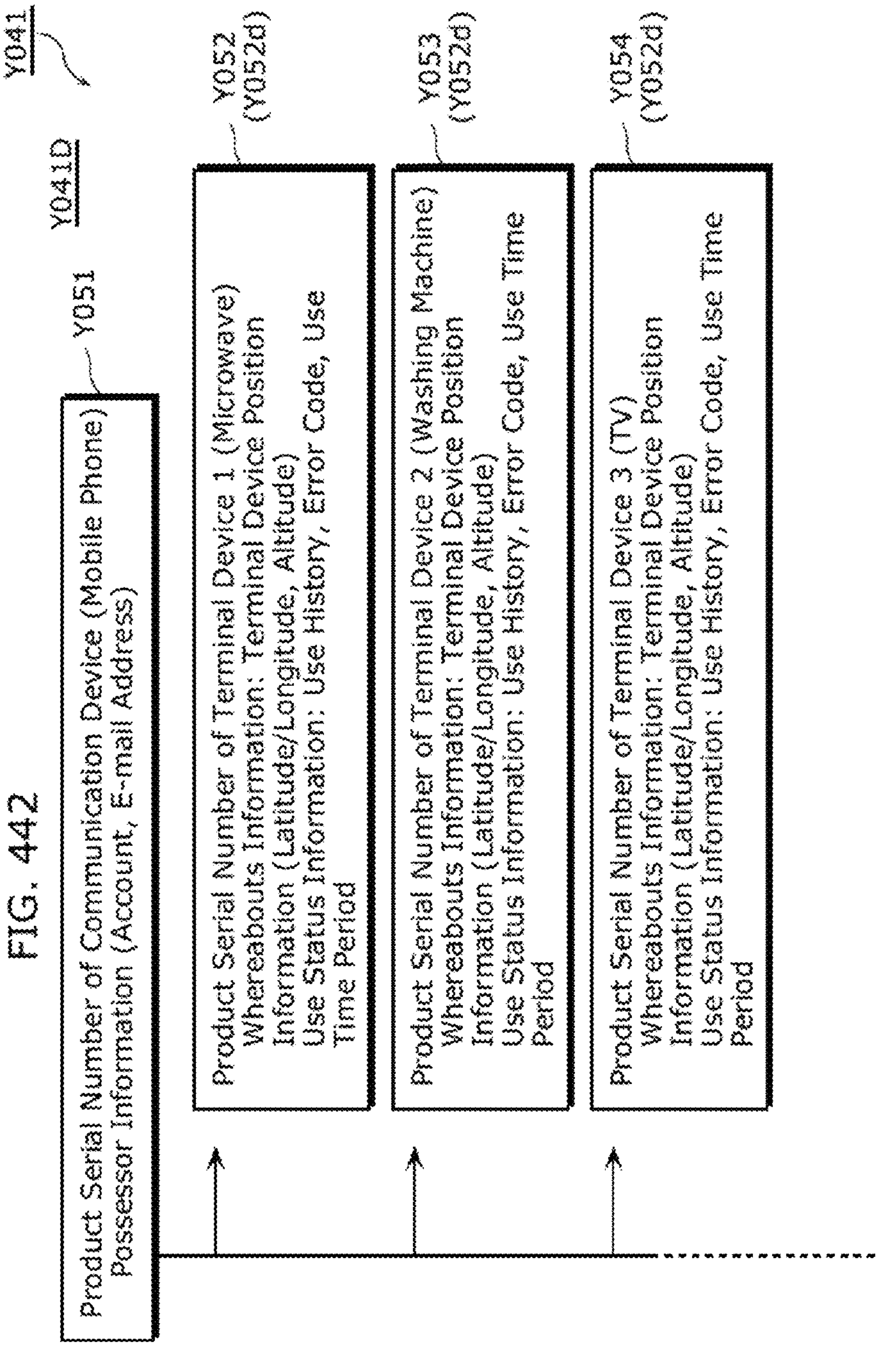

FIG. 442 is a schematic diagram of a structure of a device management database according to Embodiment B3.

Figure 443:
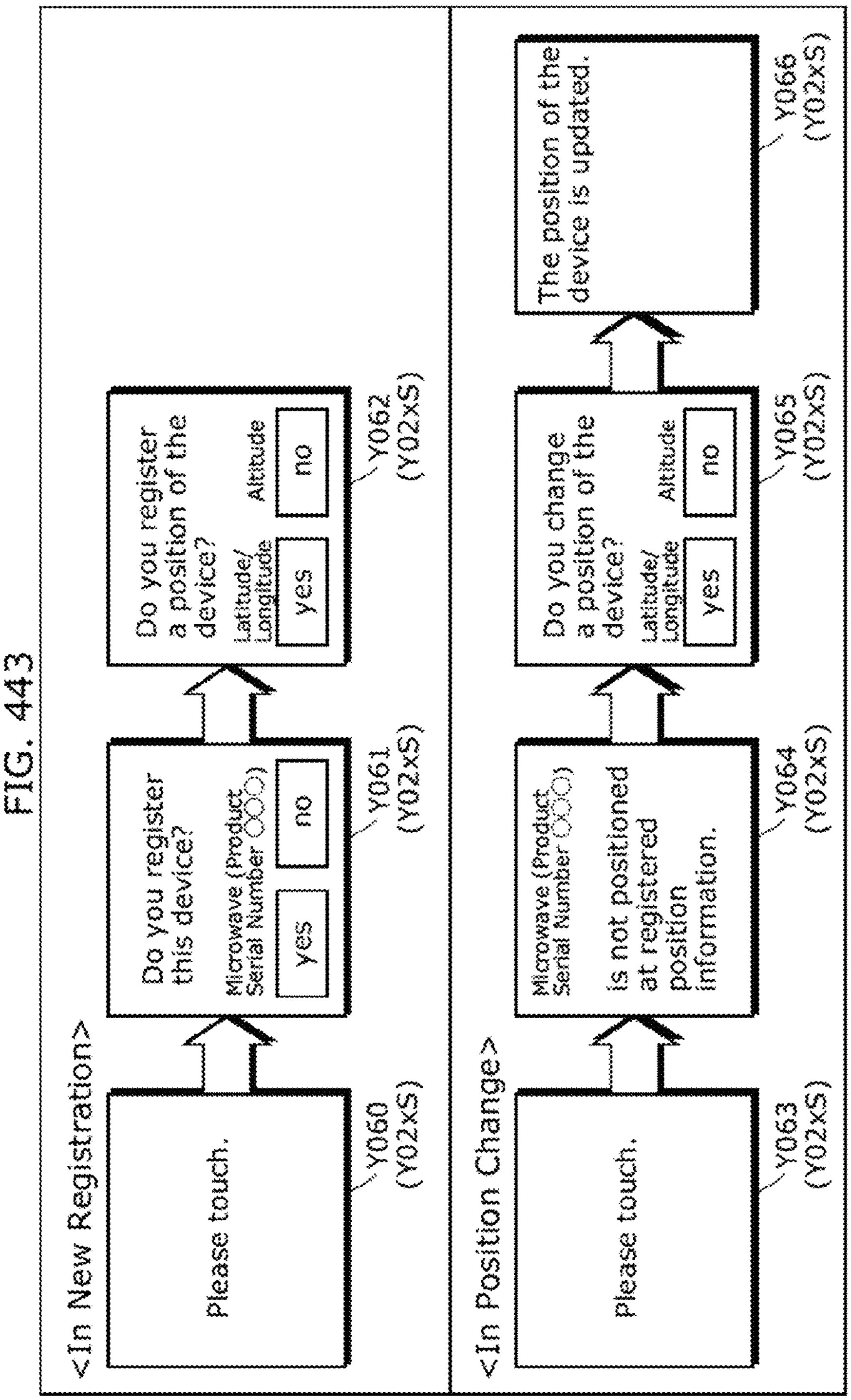

FIG. 443 is a schematic diagram of display of the device management system according to Embodiment B3.

Figure 444:
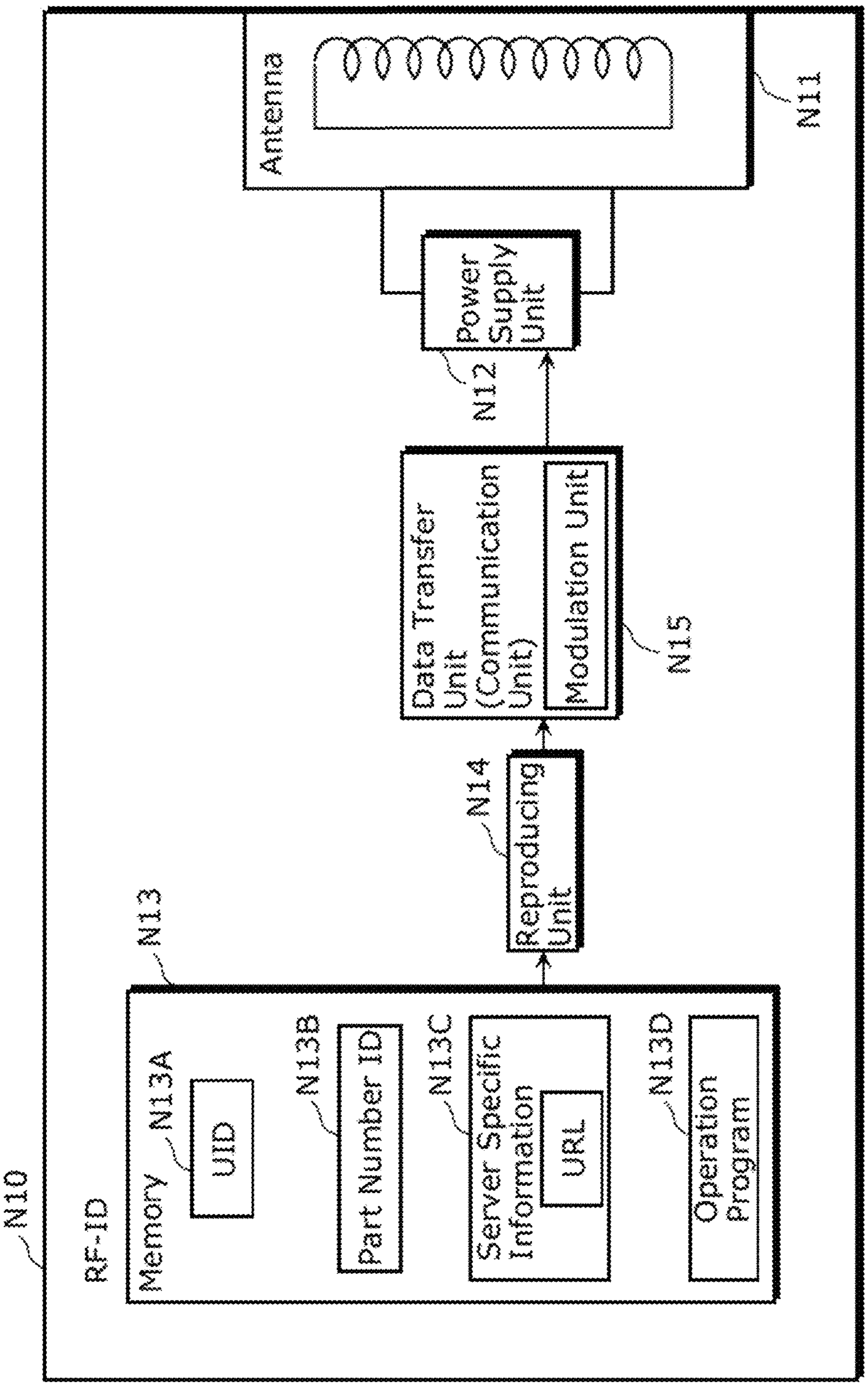

FIG. 444 is a functional block diagram of a RF-ID unit N10 according to Embodiment B4.

Figure 445:
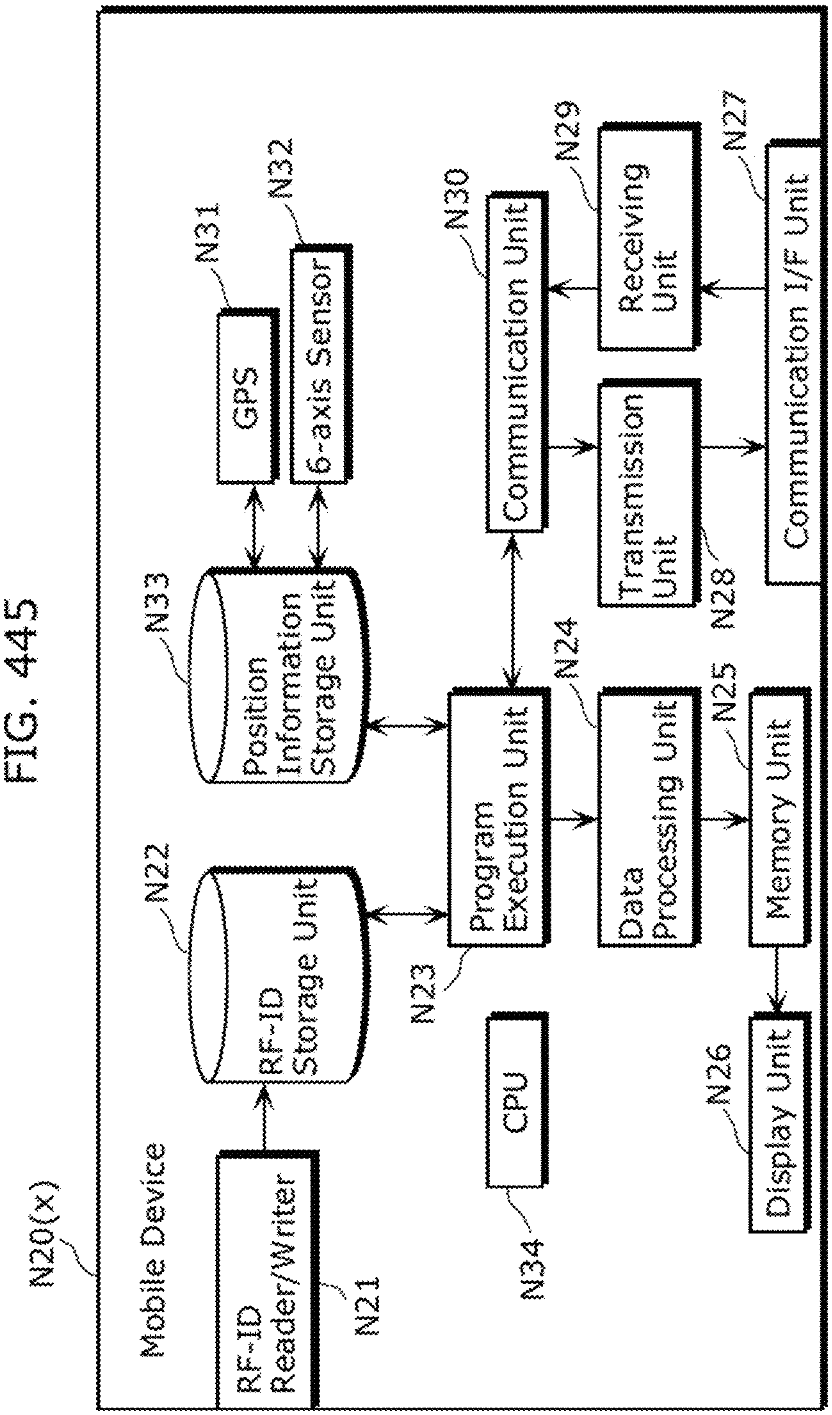

FIG. 445 is a functional block diagram of a mobile device N20 according to Embodiment B4.

Figure 446:
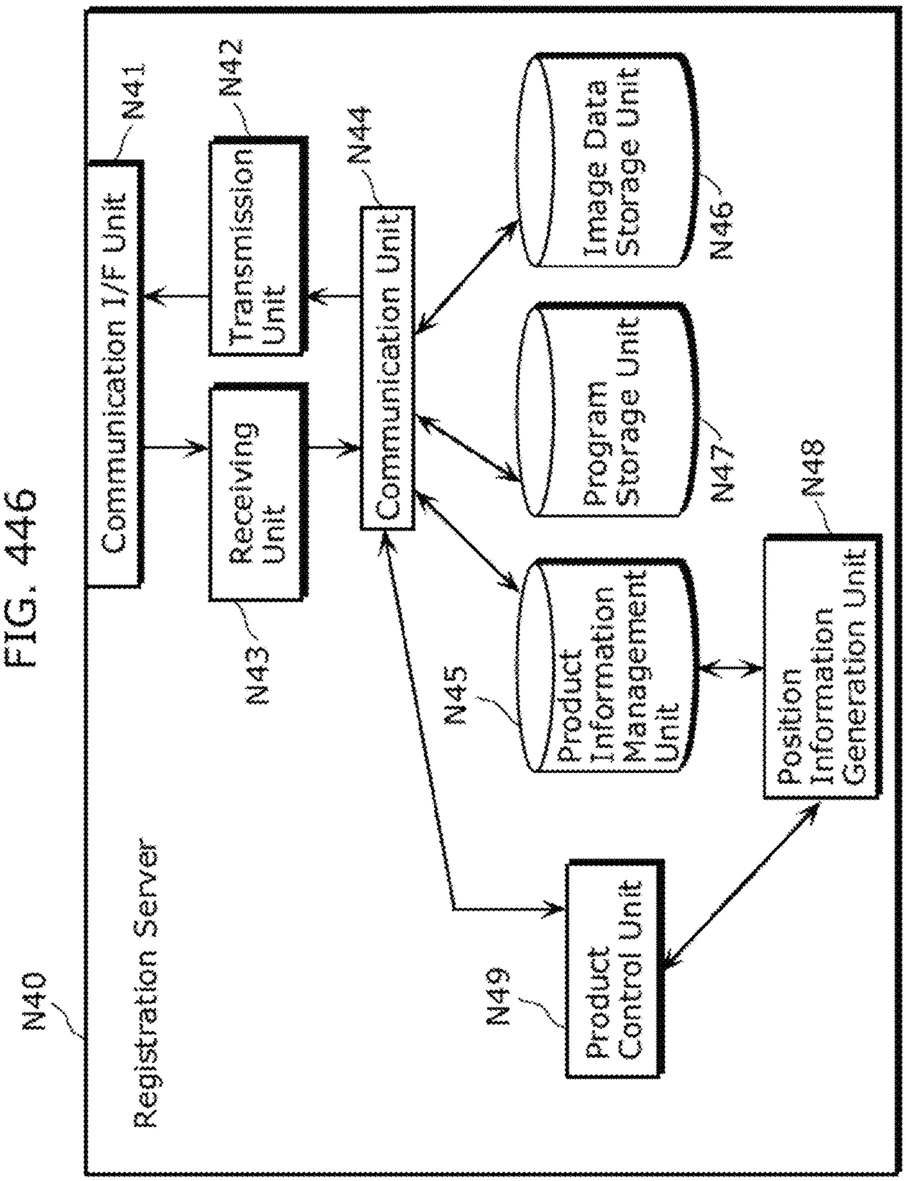

FIG. 446 is a functional block diagram of a registration server N40 according to Embodiment B4.

Figure 447:
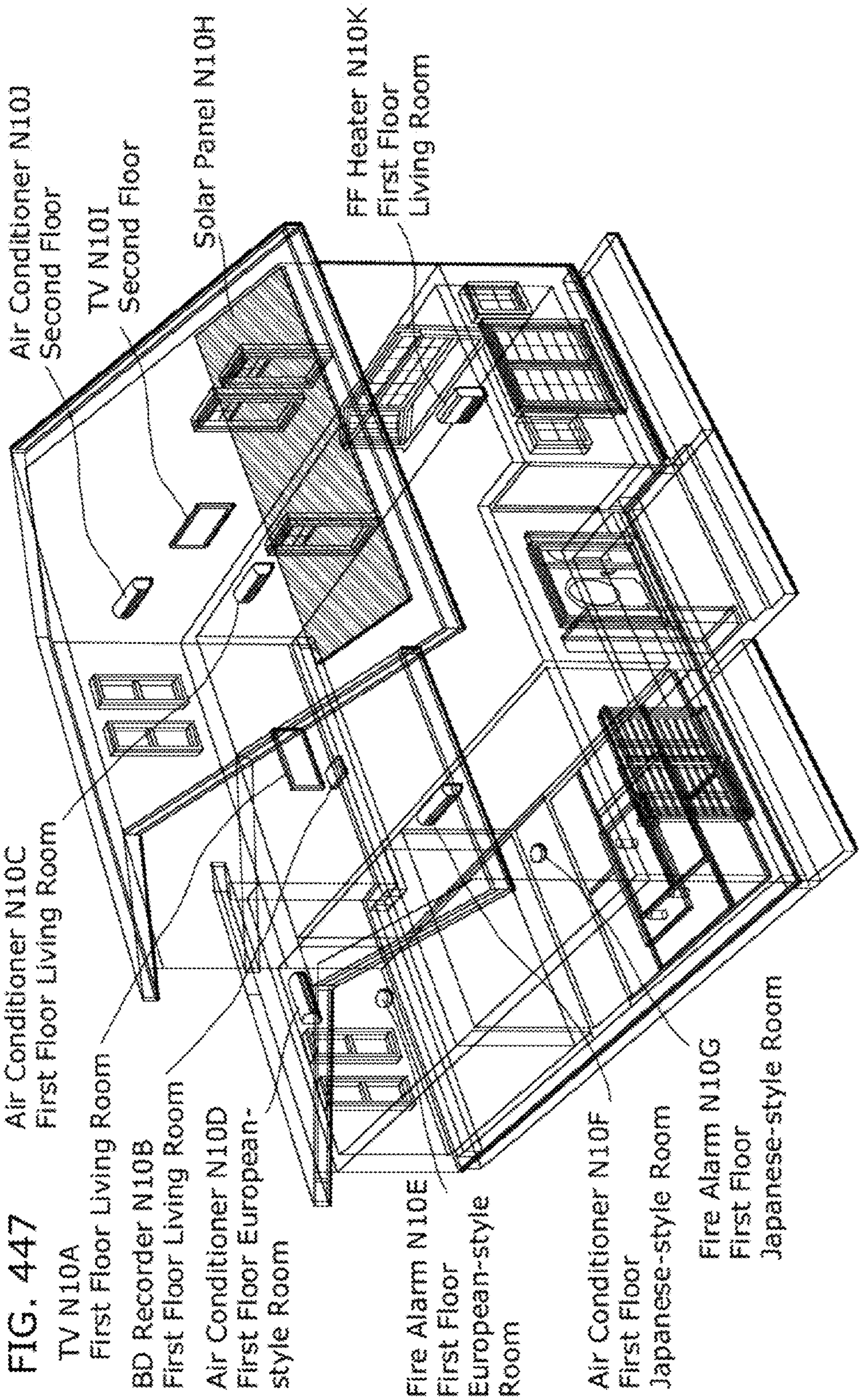

FIG. 447 is a diagram illustrating an example of an arrangement of networked products according to Embodiment B4.

Figure 448:
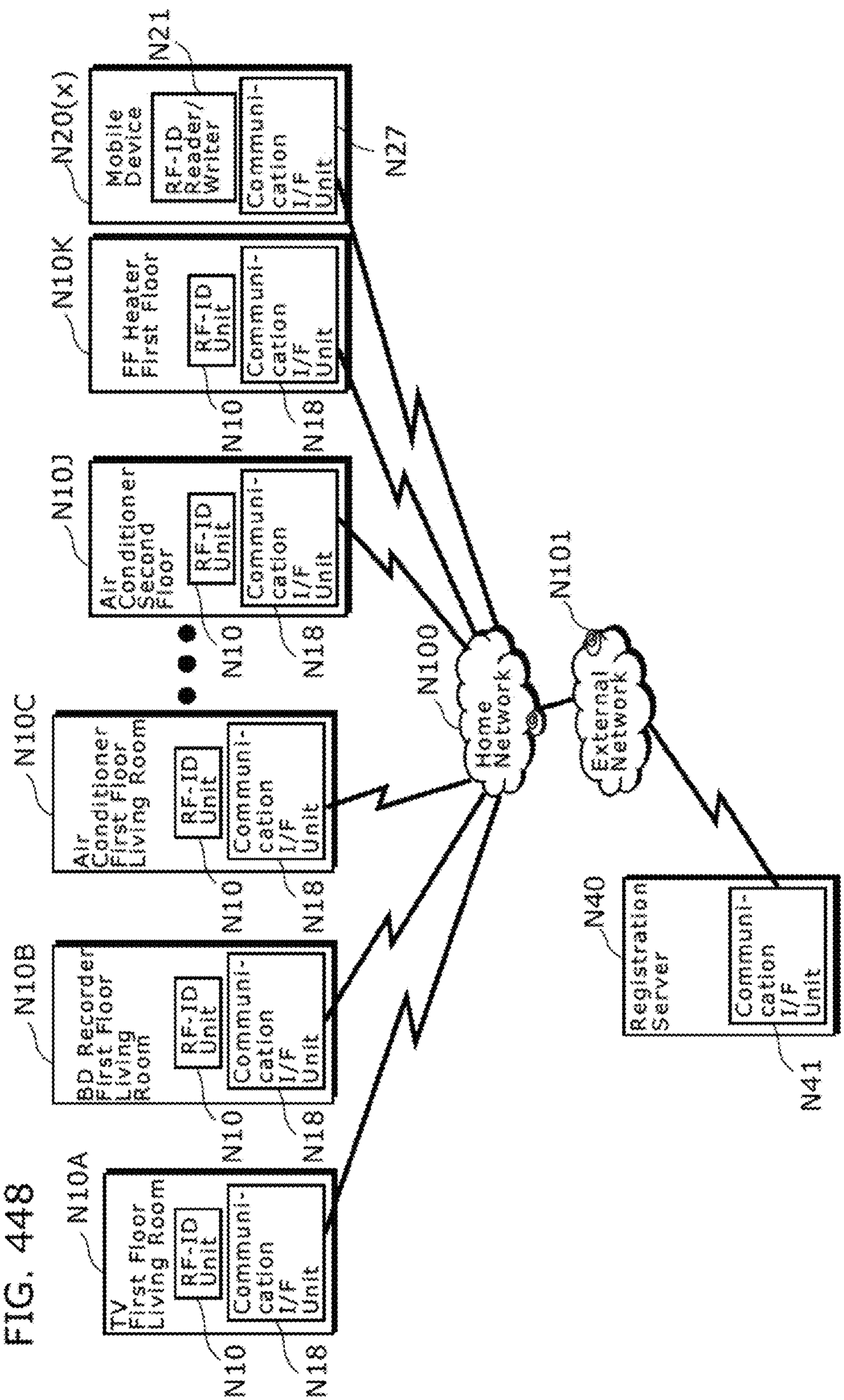

FIG. 448 is a diagram illustrating an example of a system according to Embodiment B4.

Figure 449:
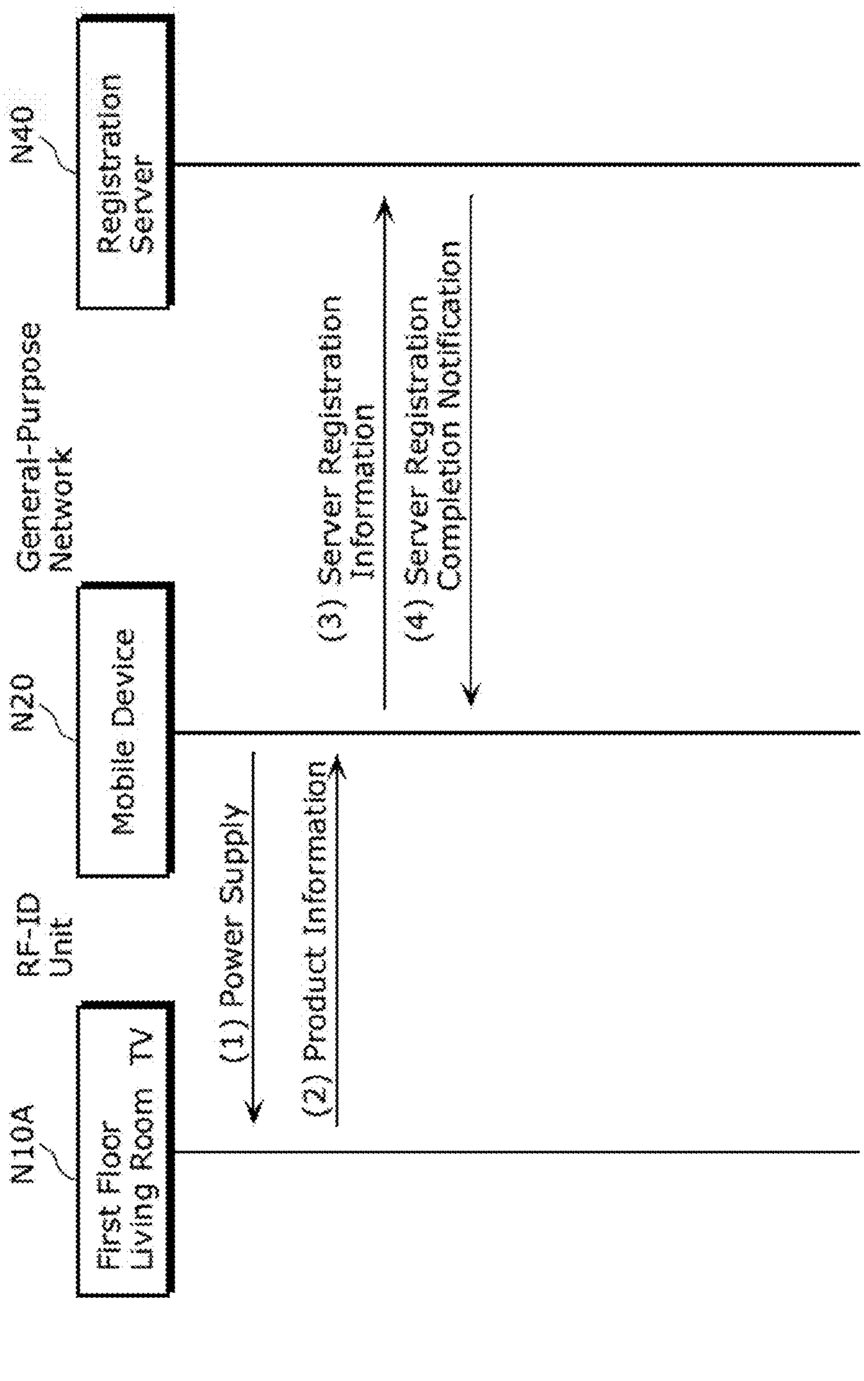

FIG. 449 is a sequence diagram for registering information of a TV N10A into a registration server N40, according to Embodiment B4.

Figure 450:
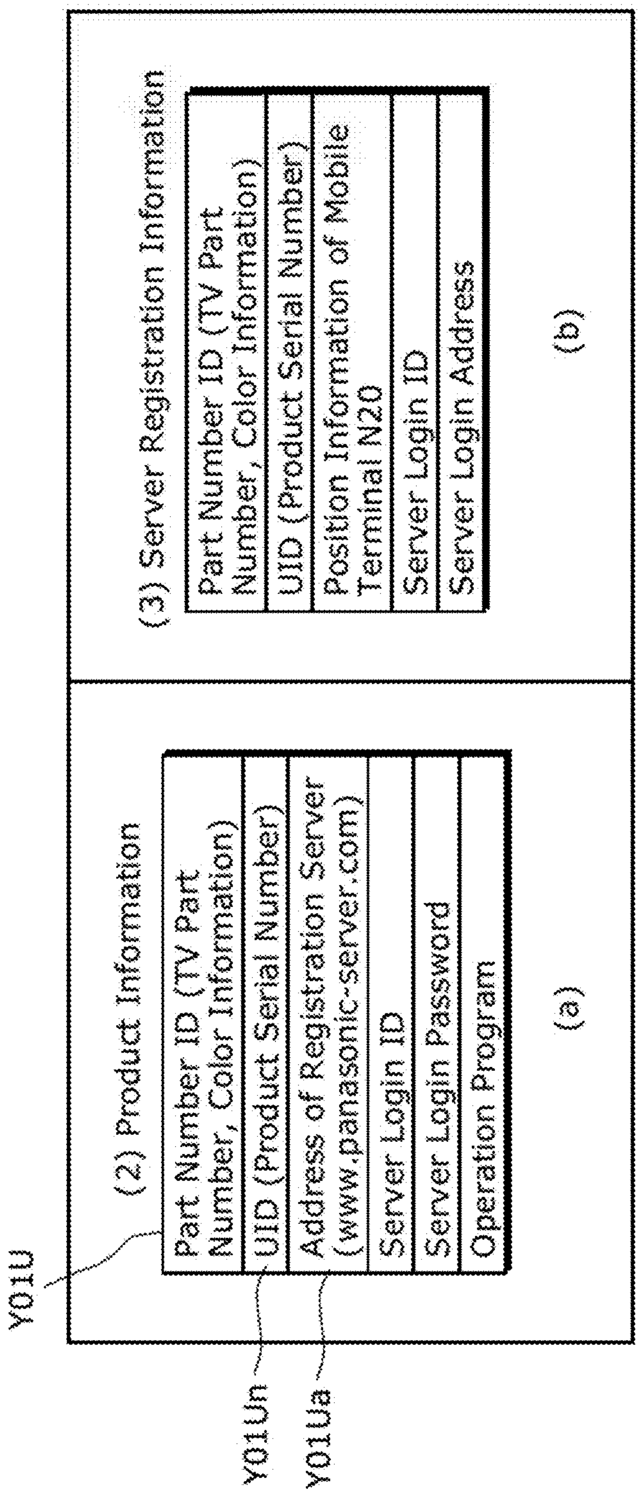

FIG. 450 is a table illustrating an example of a structure of product information and server registration information according to Embodiment B4.

FIG. 451 is a table illustrating an example of a structure of product information stored in a product information management unit N45 according to Embodiment B4.

Figure 452:
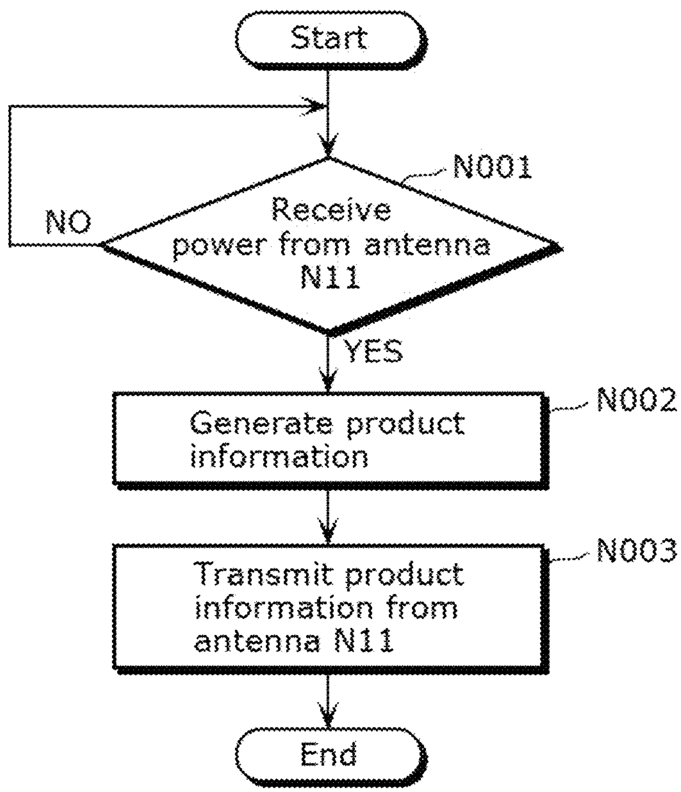

FIG. 452 is a flowchart illustrating an example of processing performed by a RF-ID unit N10 to perform product registration according to Embodiment B4.

Figure 453:
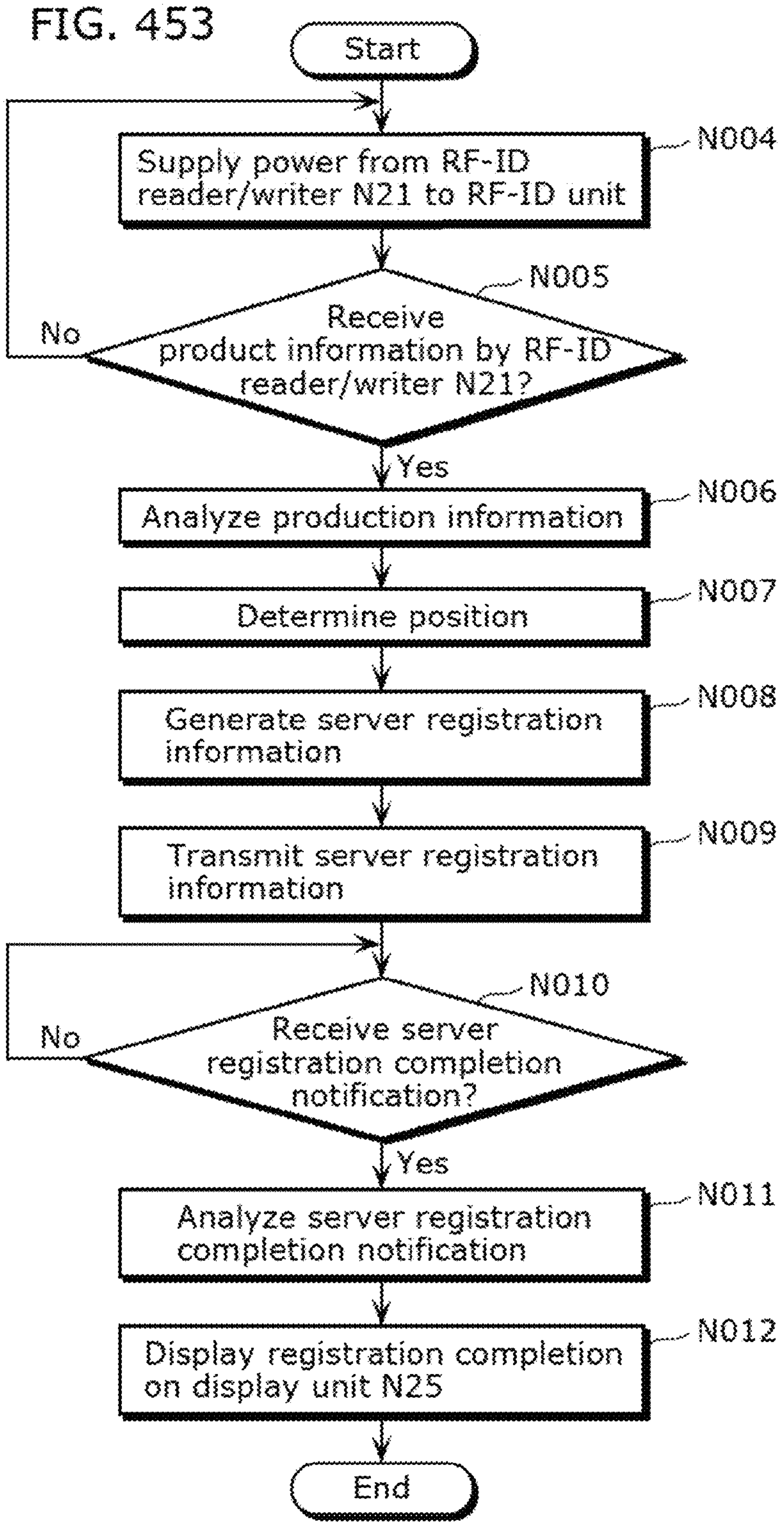

FIG. 453 is a flowchart illustrating an example of processing performed by a mobile device N20 to perform product registration according to Embodiment B4.

Figure 454:
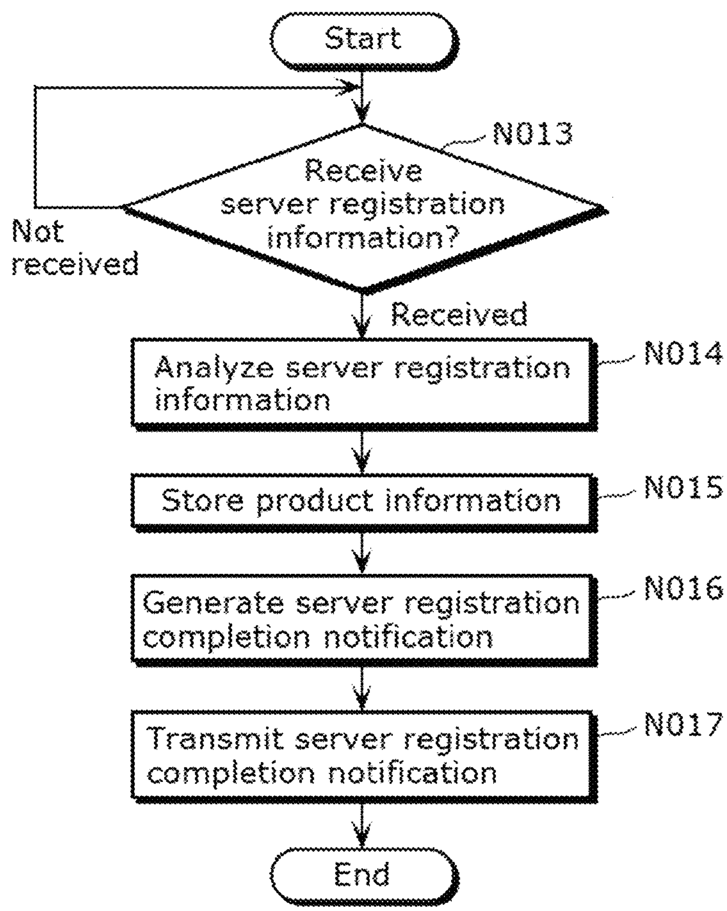

FIG. 454 is a flowchart illustrating an example of processing performed by a registration server N40 to perform product registration according to Embodiment B4.

Figure 455:
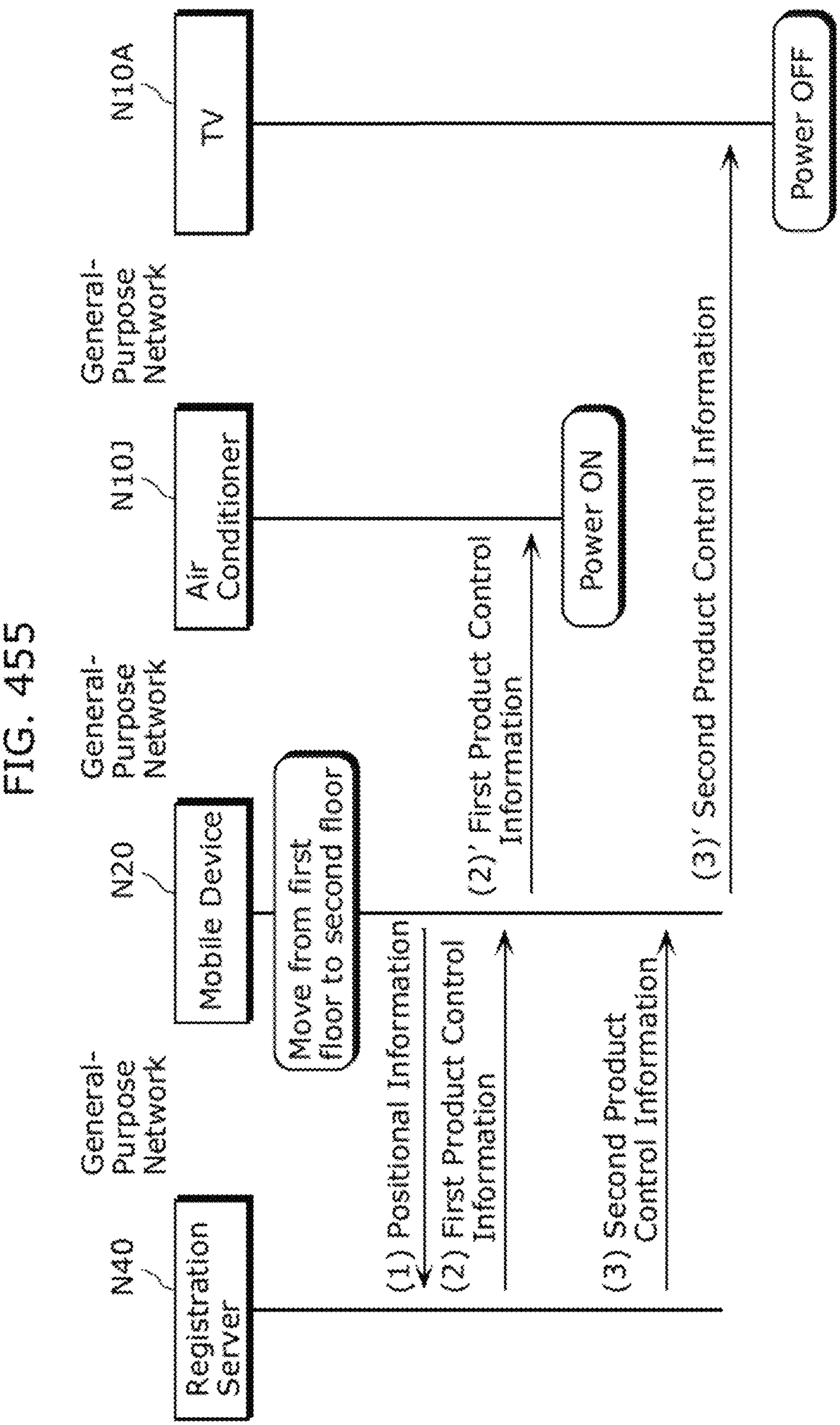

FIG. 455 is a sequence diagram illustrating an example of controlling power for an air conditioner N10J and a TV N10A according to Embodiment B4.

Figure 456:
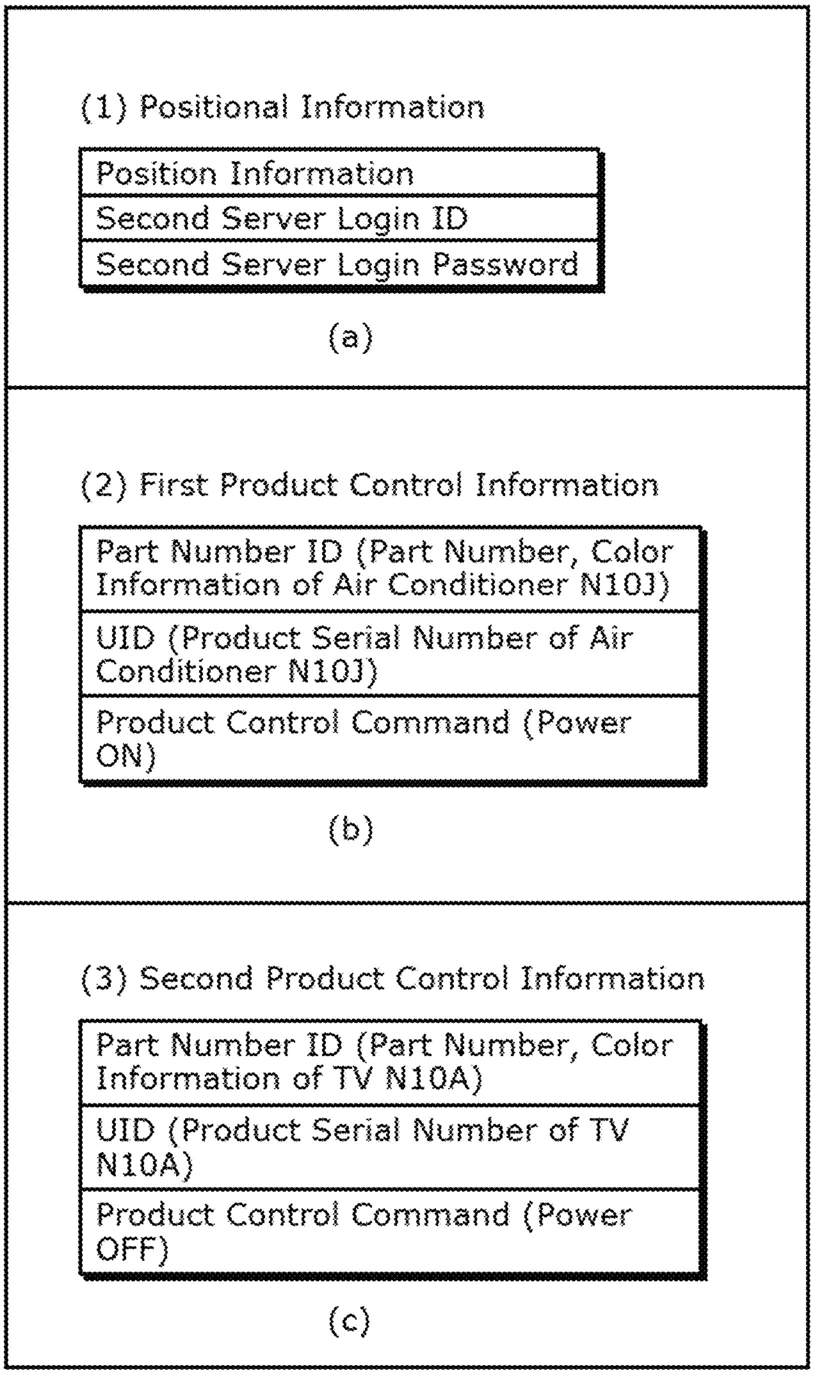

FIG. 456 is a table illustrating an example of a structure of positional information and product control information according to Embodiment B4.

Figure 457:
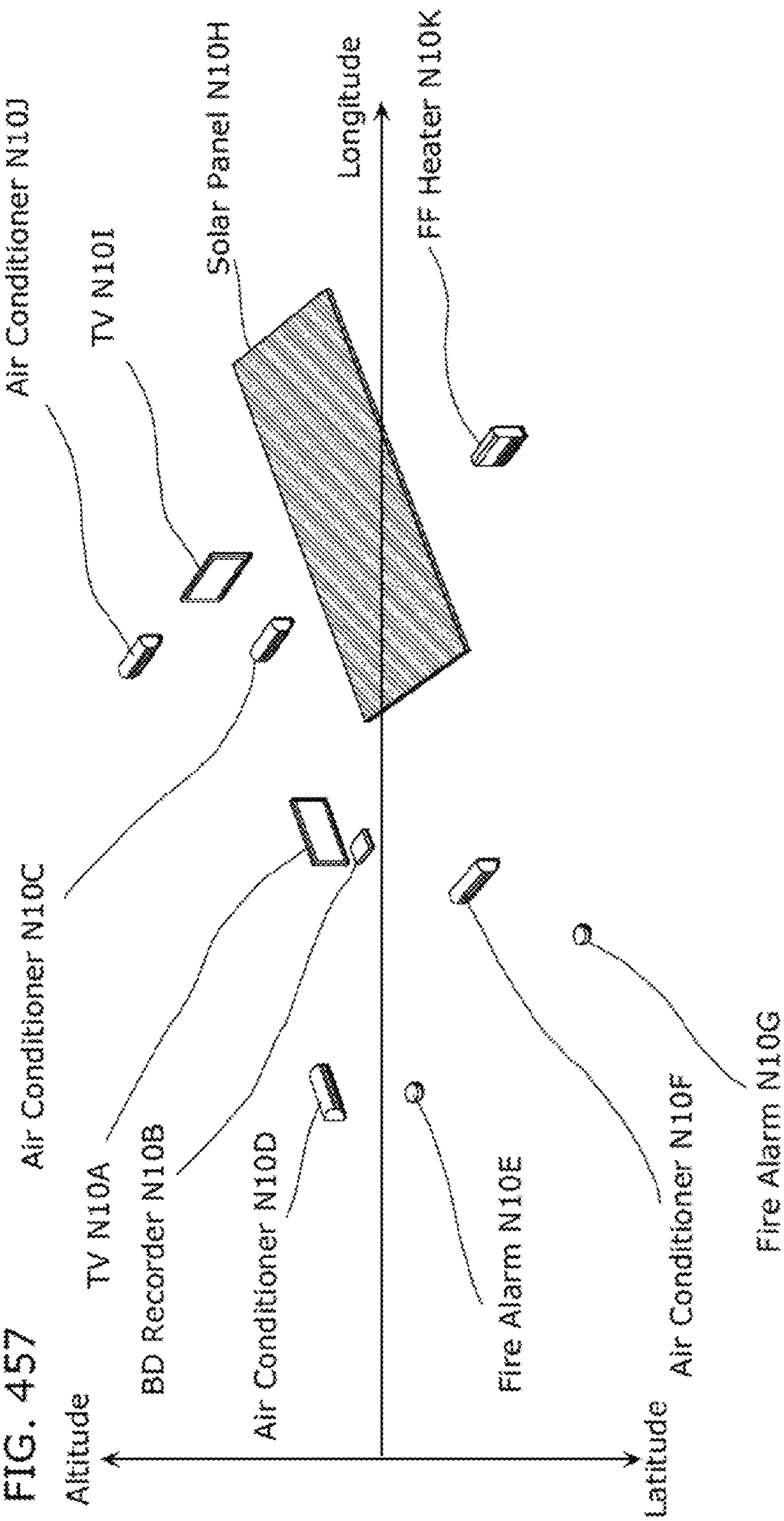

FIG. 457 is a diagram illustrating a product map generated by a position information generation unit N48 according to Embodiment B4.

FIG. 458 is a table illustrating an example of a structure of product information stored in the product information management unit N45 according to Embodiment B4.

Figure 459:
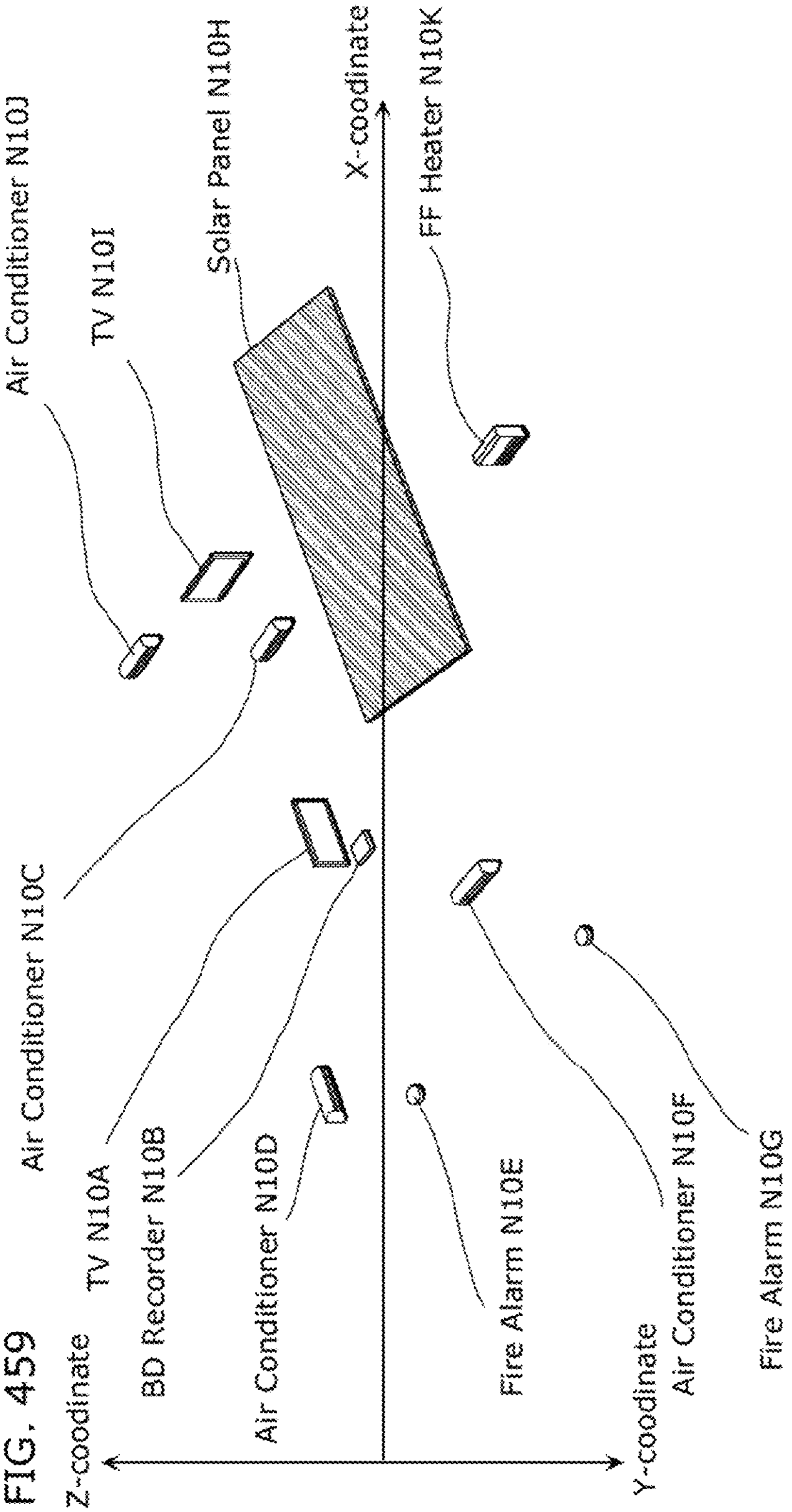

FIG. 459 is a diagram illustrating a product map generated by the position information generation unit N48 according to Embodiment B4.

FIG. 460 is a table illustrating examples of an accuracy identifier according to Embodiment B4.

Figure 461:
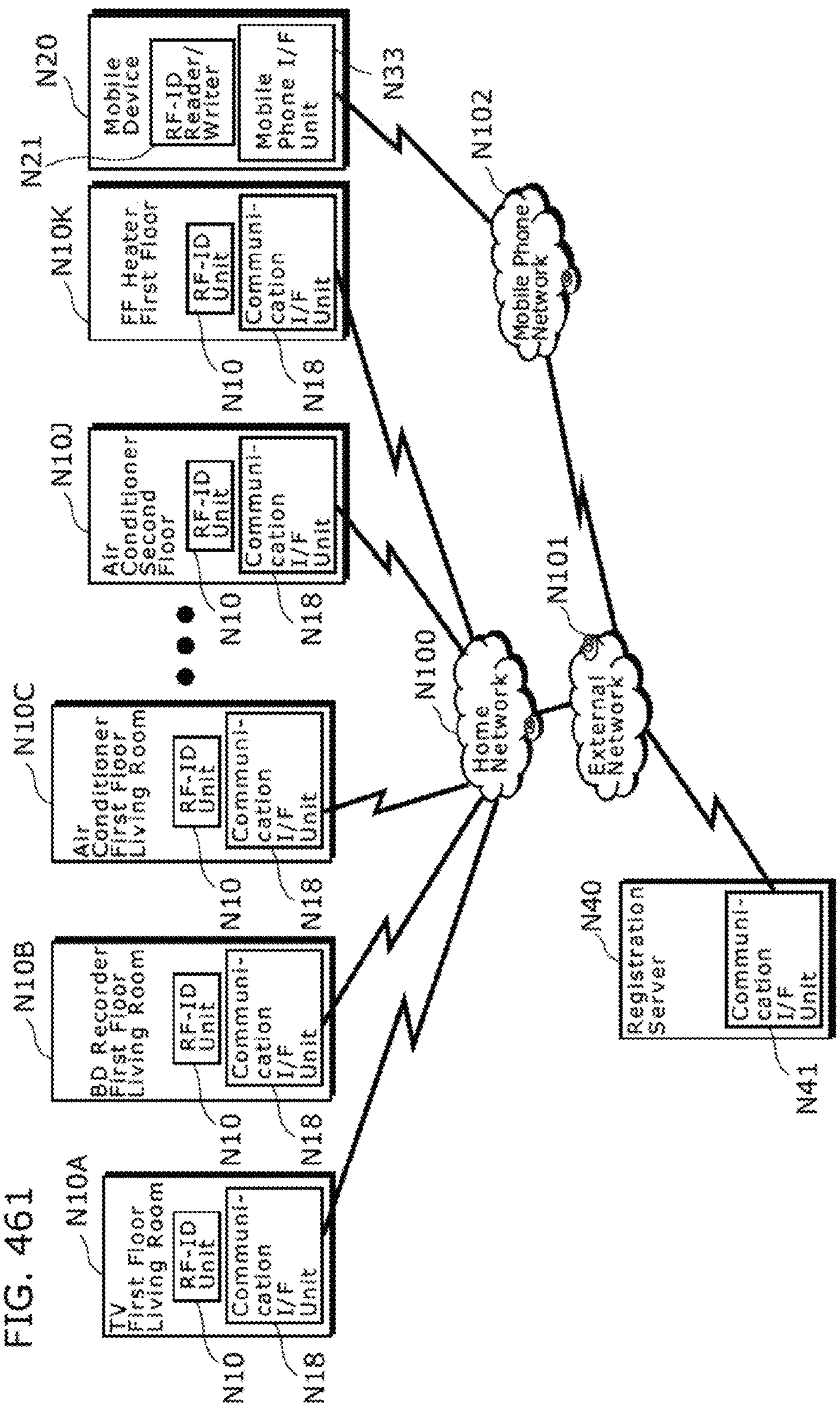

FIG. 461 is a diagram illustrating an example of a system according to Embodiment B4.

Figure 462:
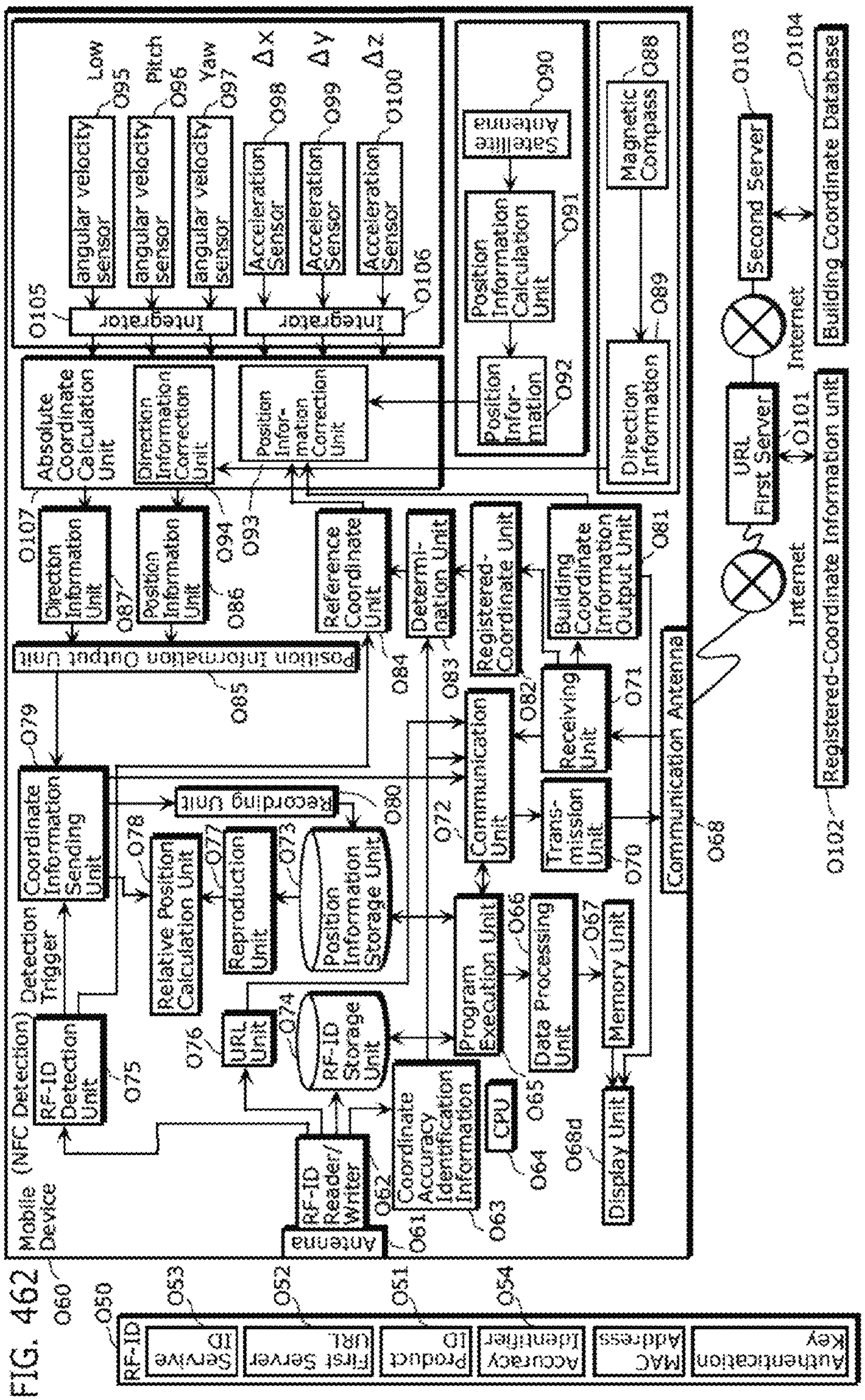

FIG. 462 is a diagram illustrating an example of an entire system according to Embodiment B5.

Figure 463:
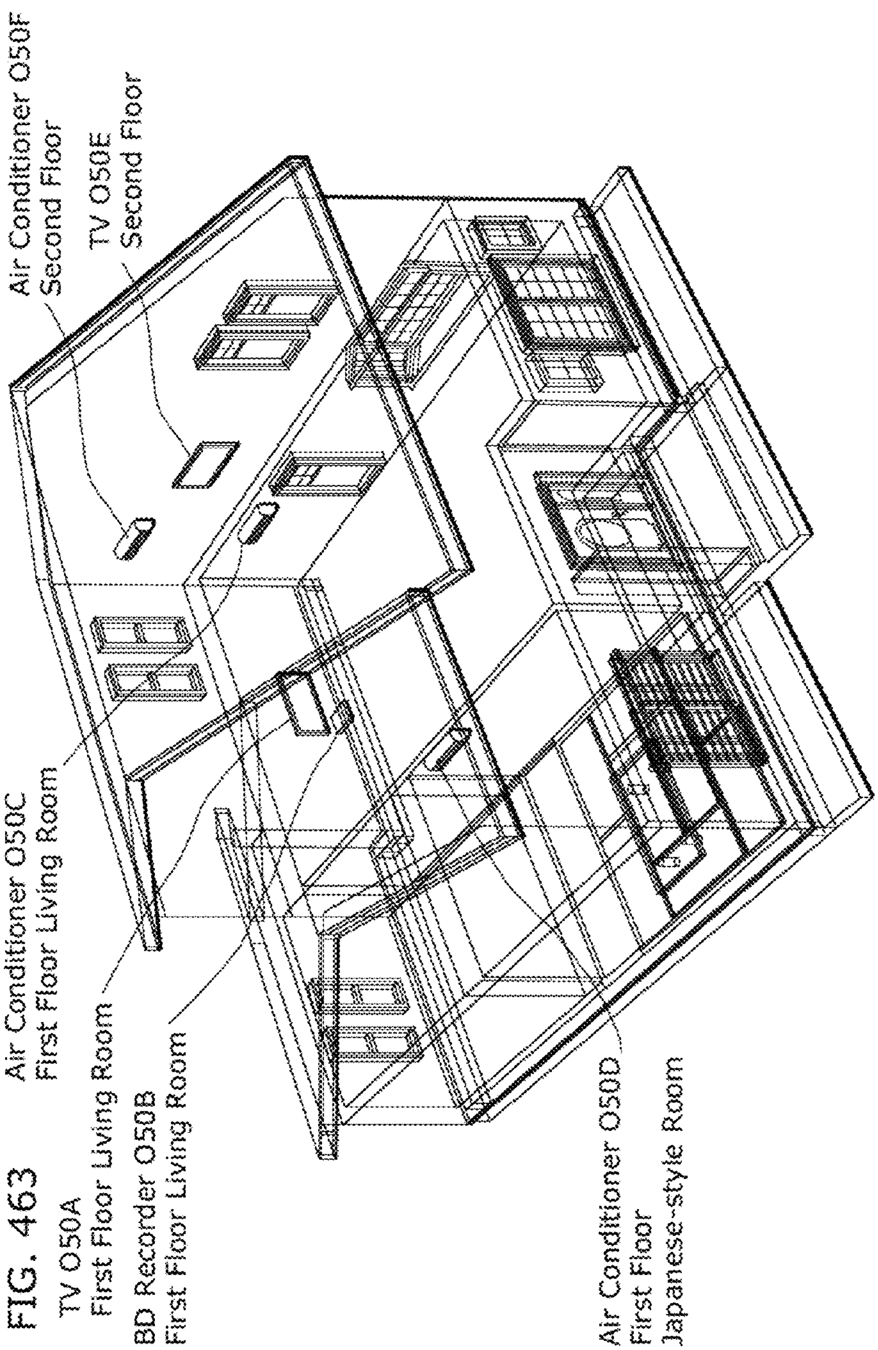

FIG. 463 is a diagram illustrating an example of an arrangement of products embedded with RF-ID units O50 according to Embodiment B5.

Figure 464:
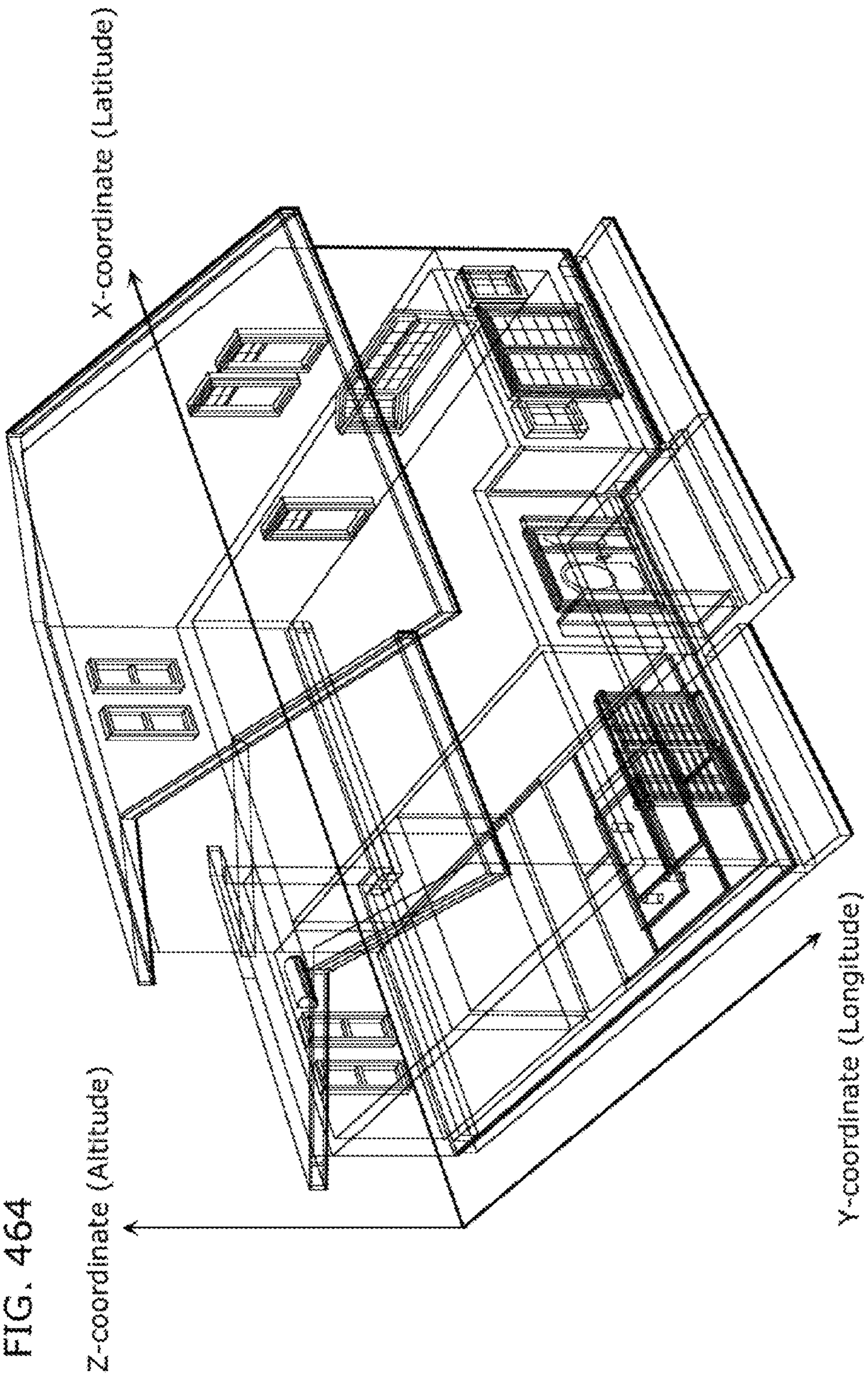

FIG. 464 is a diagram illustrating an example of a three-dimensional (3D) map of a building, which is building coordinate information extracted from a building coordinate database O104 according to Embodiment B5.

Figure 465:
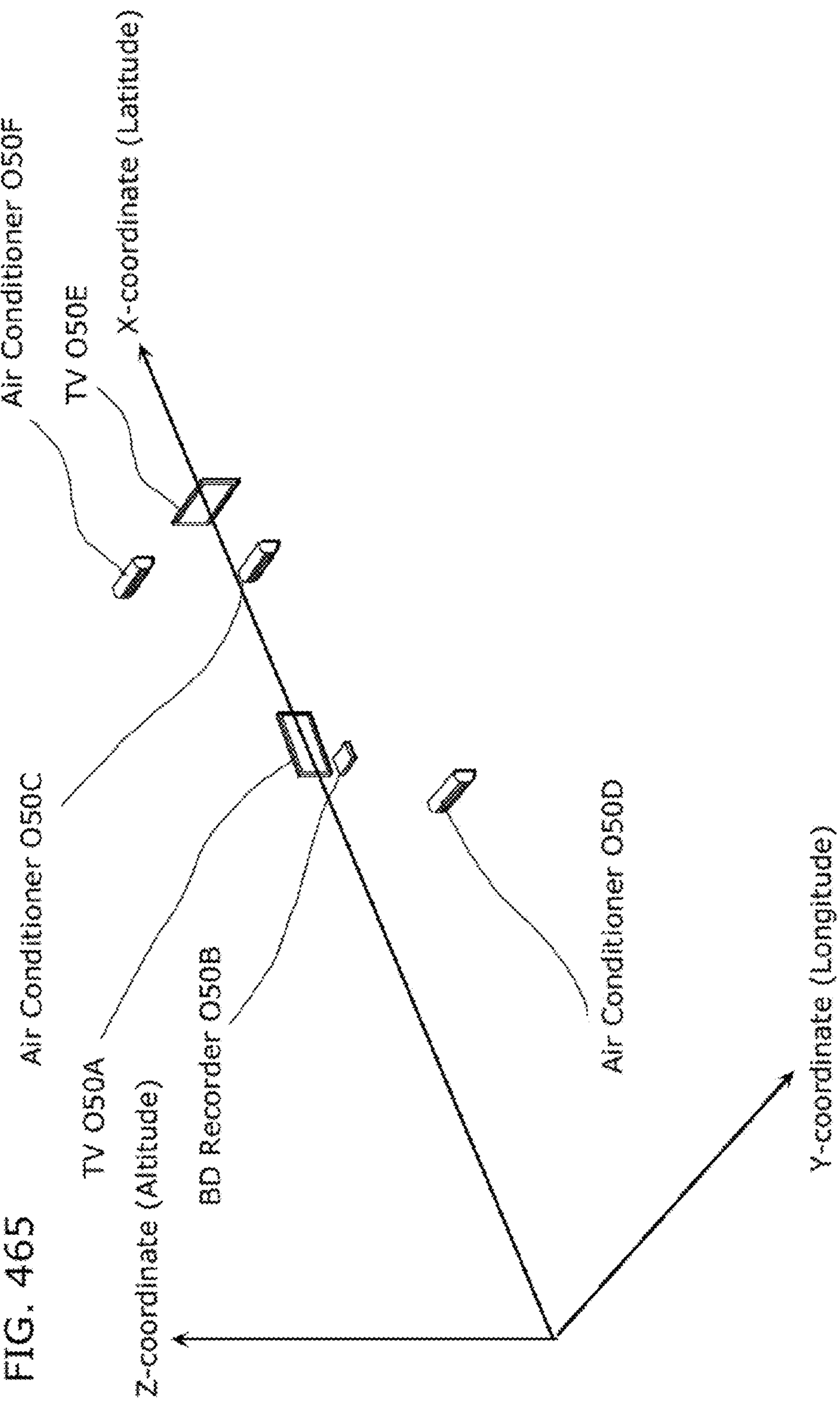

FIG. 465 is a diagram illustrating an example of image data of a 3D map of products which is generated by a program execution unit O65 according to Embodiment B5.

Figure 466:
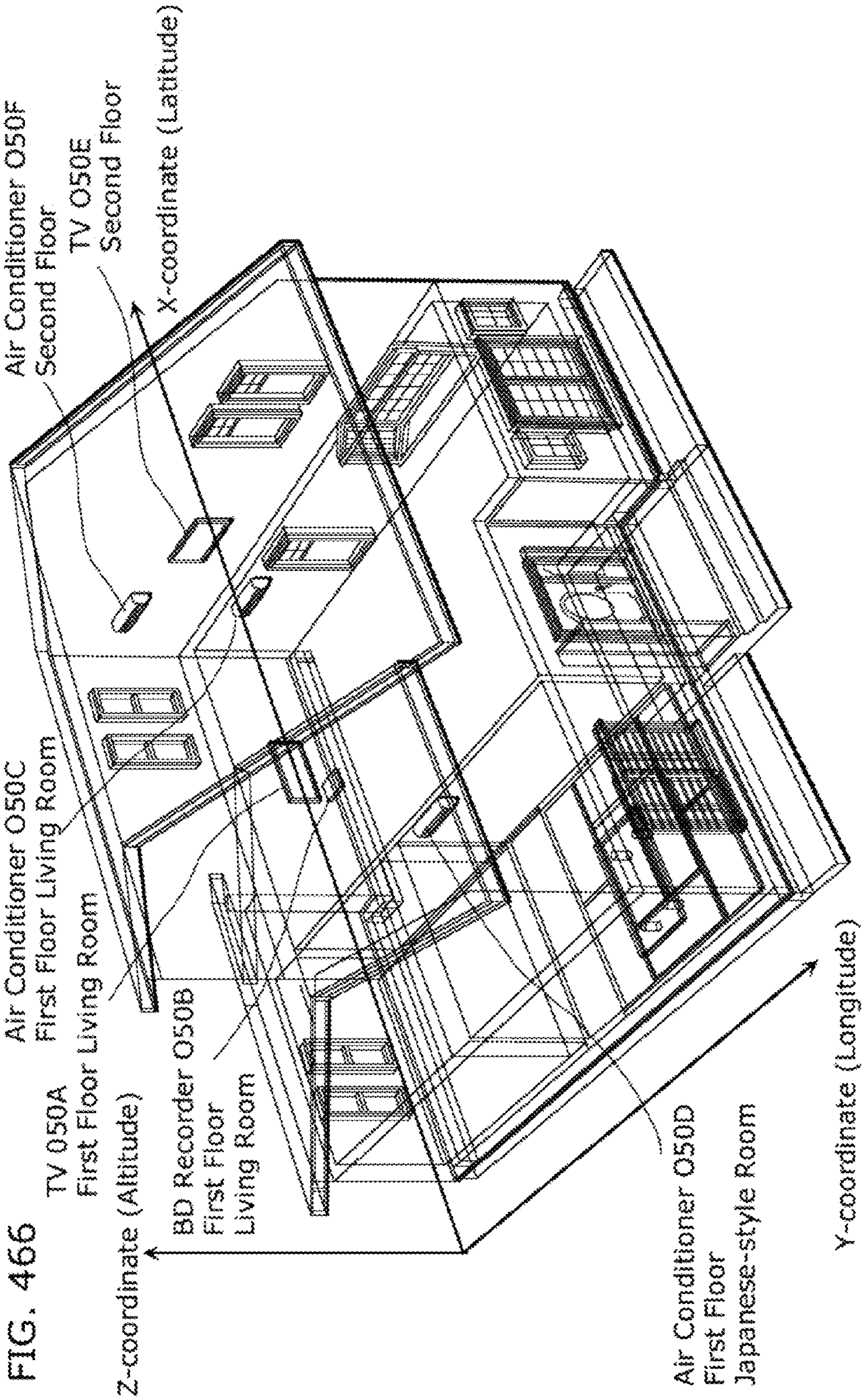

FIG. 466 is a diagram illustrating an example of a 3D product map in which image data of FIG. 464 is combined with the already-displayed image data of FIG. 465 by a display unit O68*d* according to Embodiment B5.

FIG. 467 is a table illustrating examples of an accuracy identifier according to Embodiment B5.

Figure 468:
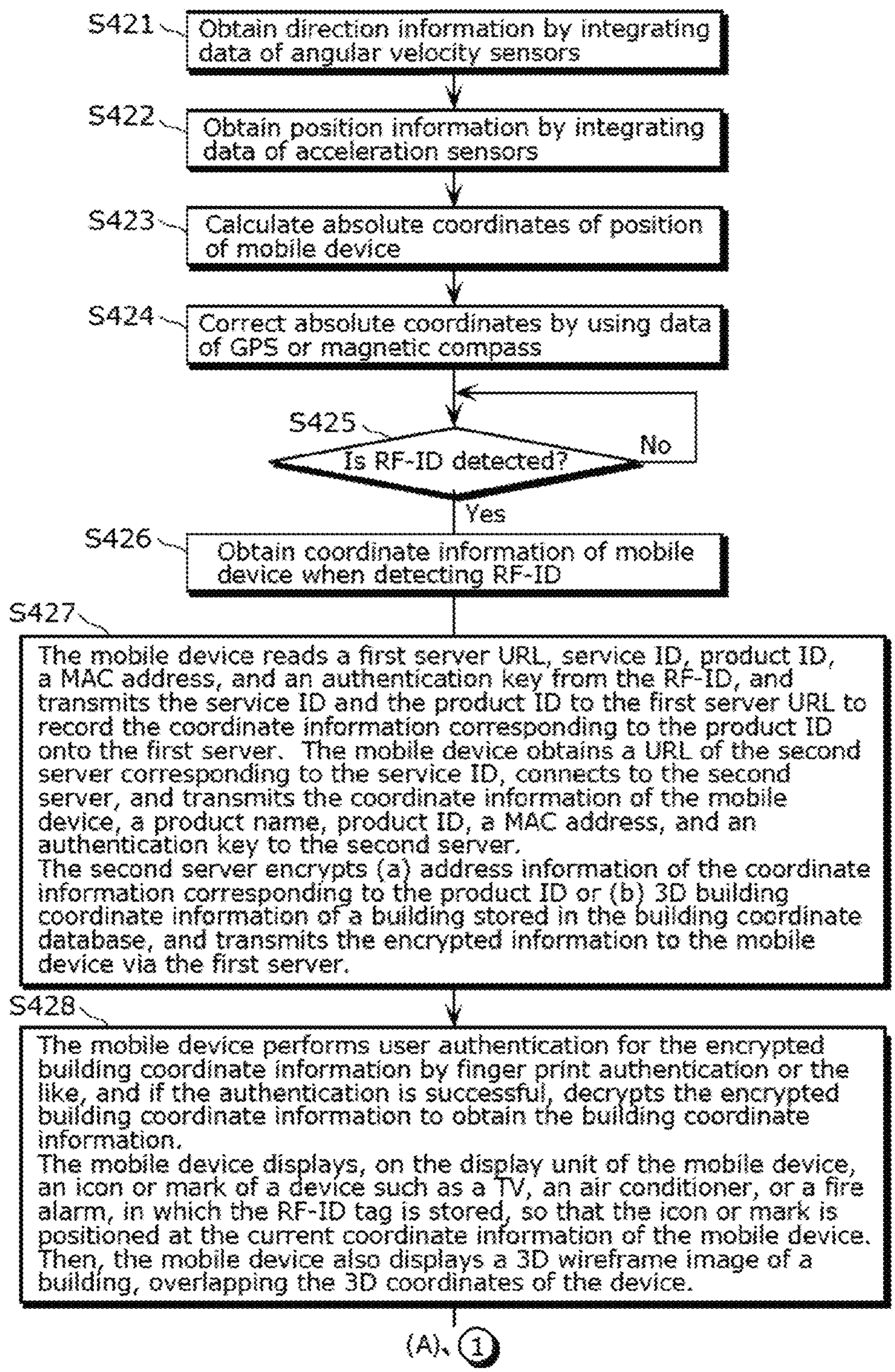

FIG. 468 is a flowchart illustrating an example of processing for the 3D map according to Embodiment B5.

FIG. 469 is a flowchart illustrating an example of processing for the 3D map according to Embodiment B5.

Figure 470:
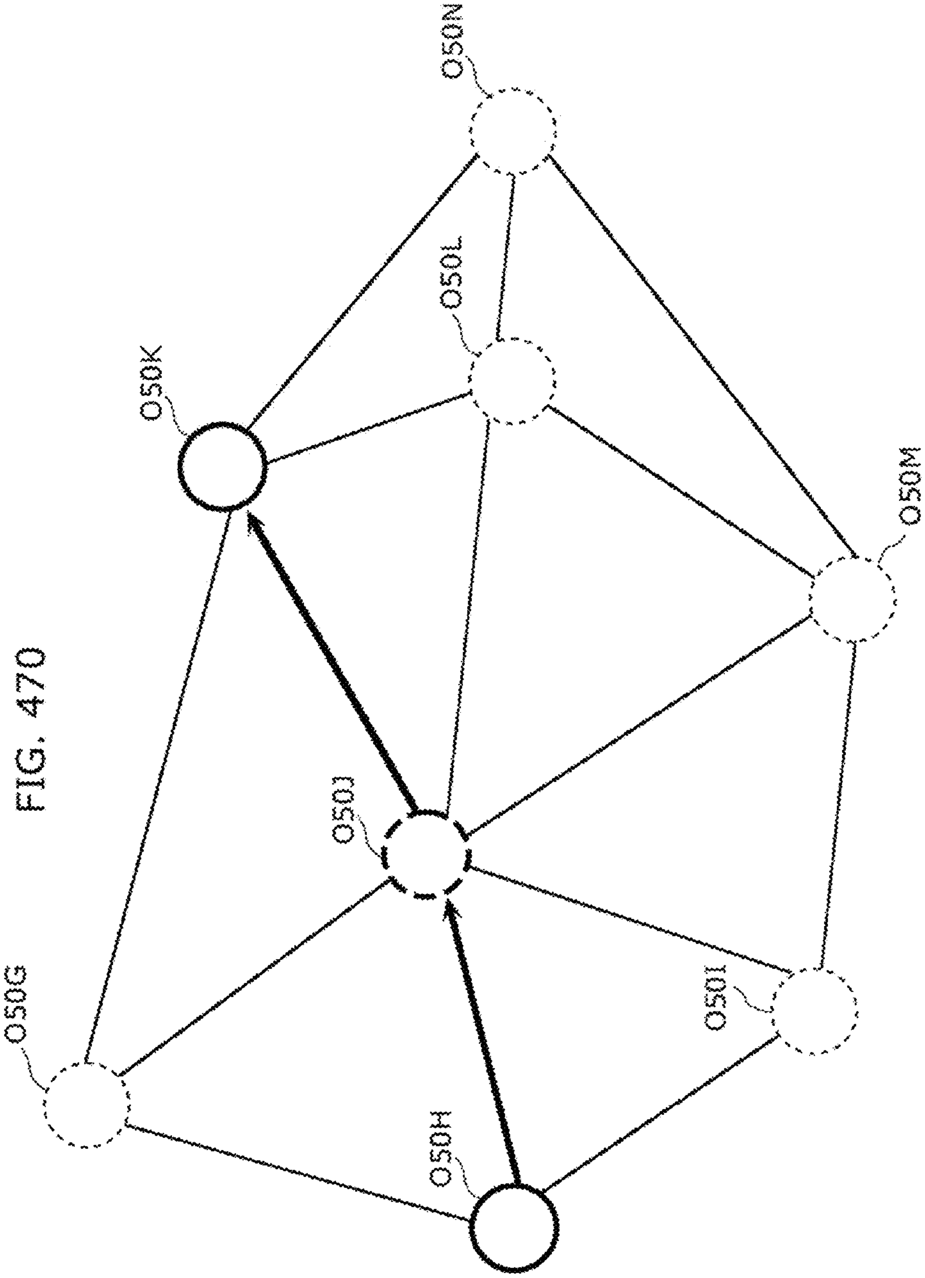

FIG. 470 is a diagram illustrating an example of a specific small power wireless communication system using the 3D map according to Embodiment B5.

Figure 471:
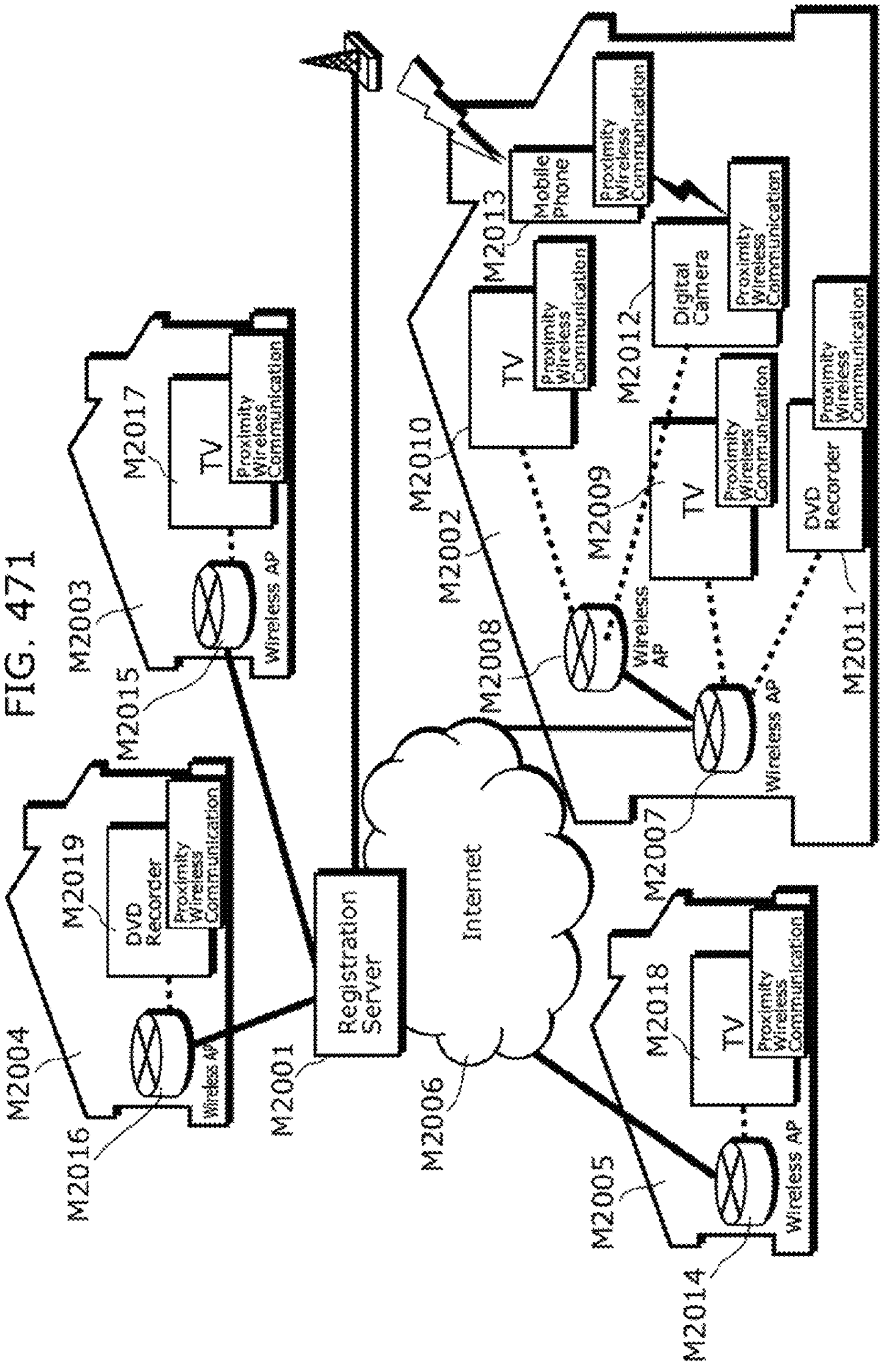

FIG. 471 is a diagram of a network environment for a wireless connection request according to Embodiment B6.

Figure 472:
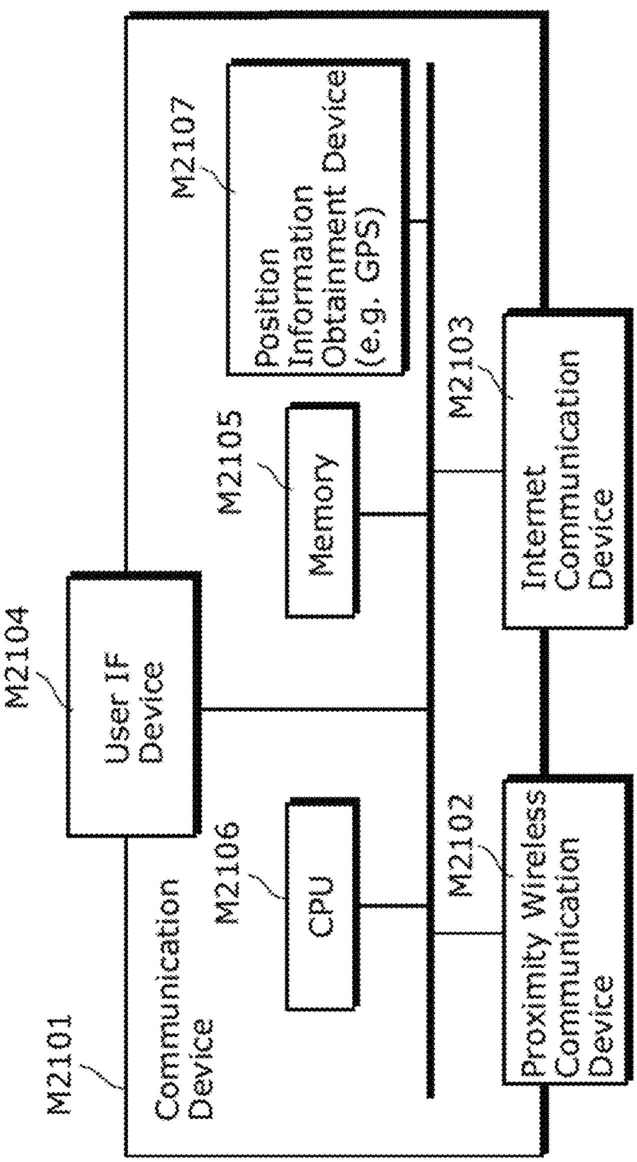

FIG. 472 is a hardware diagram of a communication device for the wireless connection request according to Embodiment B6.

Figure 473:
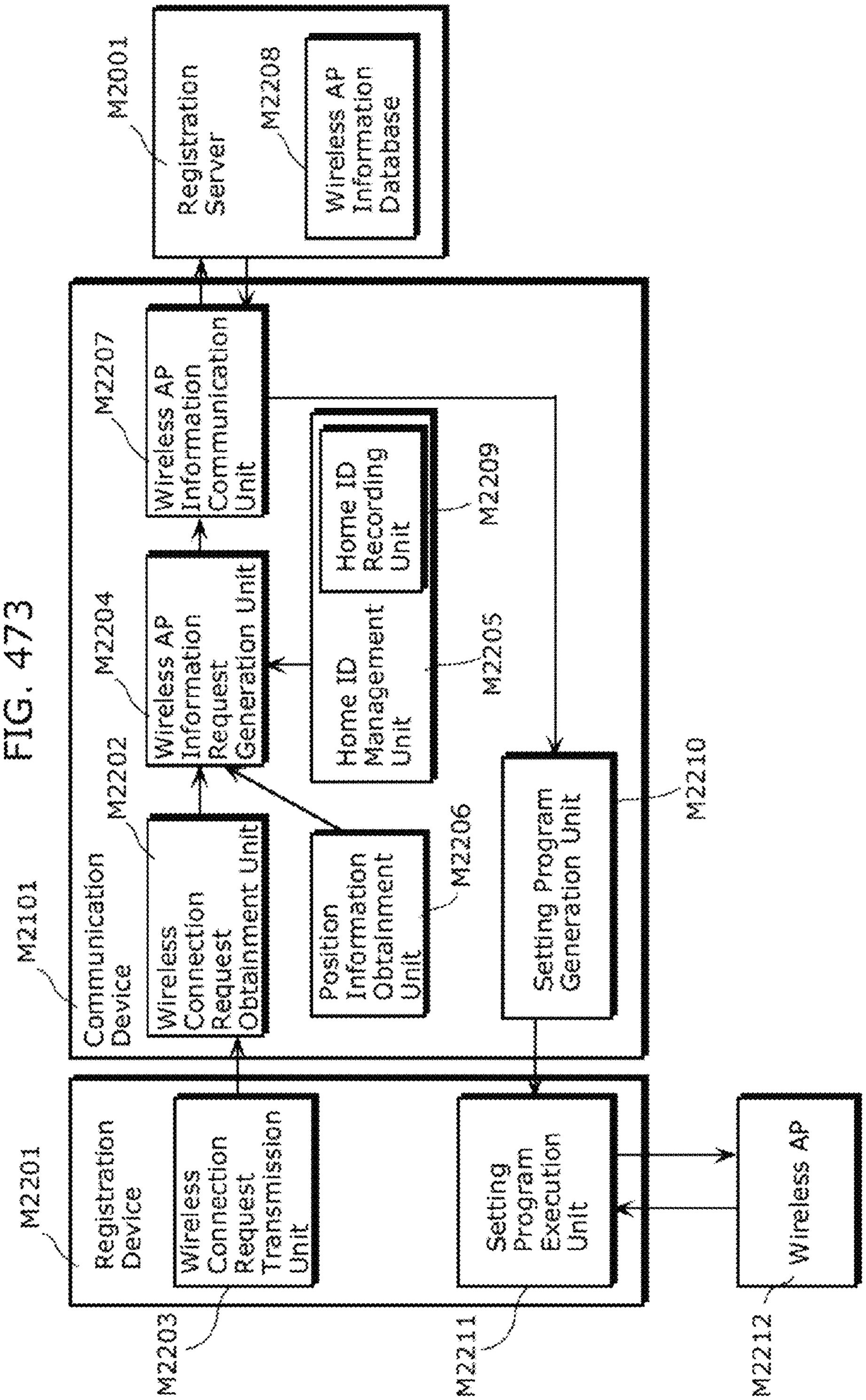

FIG. 473 is a functional block diagram of the communication device for the wireless connection request according to Embodiment B6.

Figure 474:
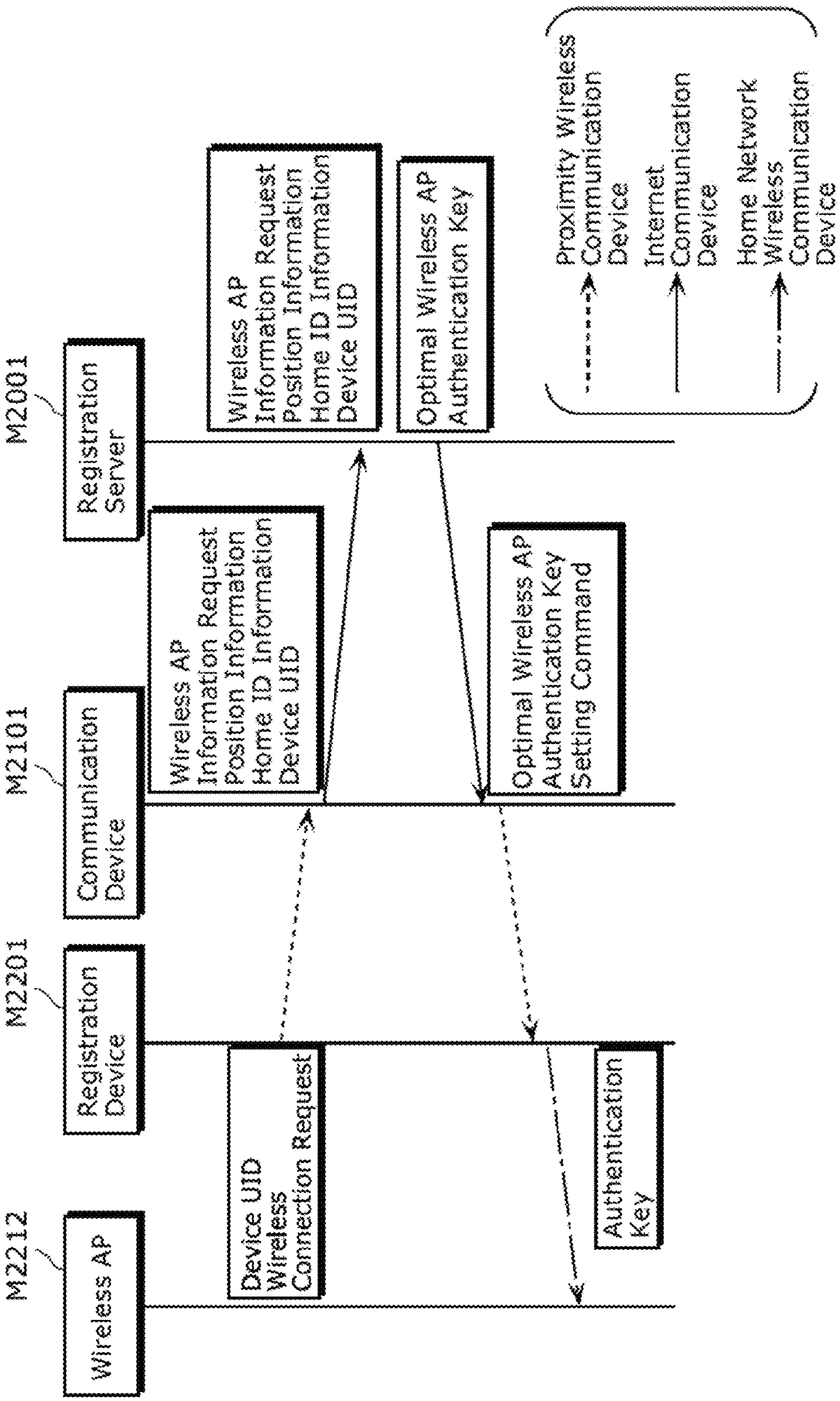

FIG. 474 is a sequence diagram of the wireless connection request according to Embodiment B6.

Figure 475:
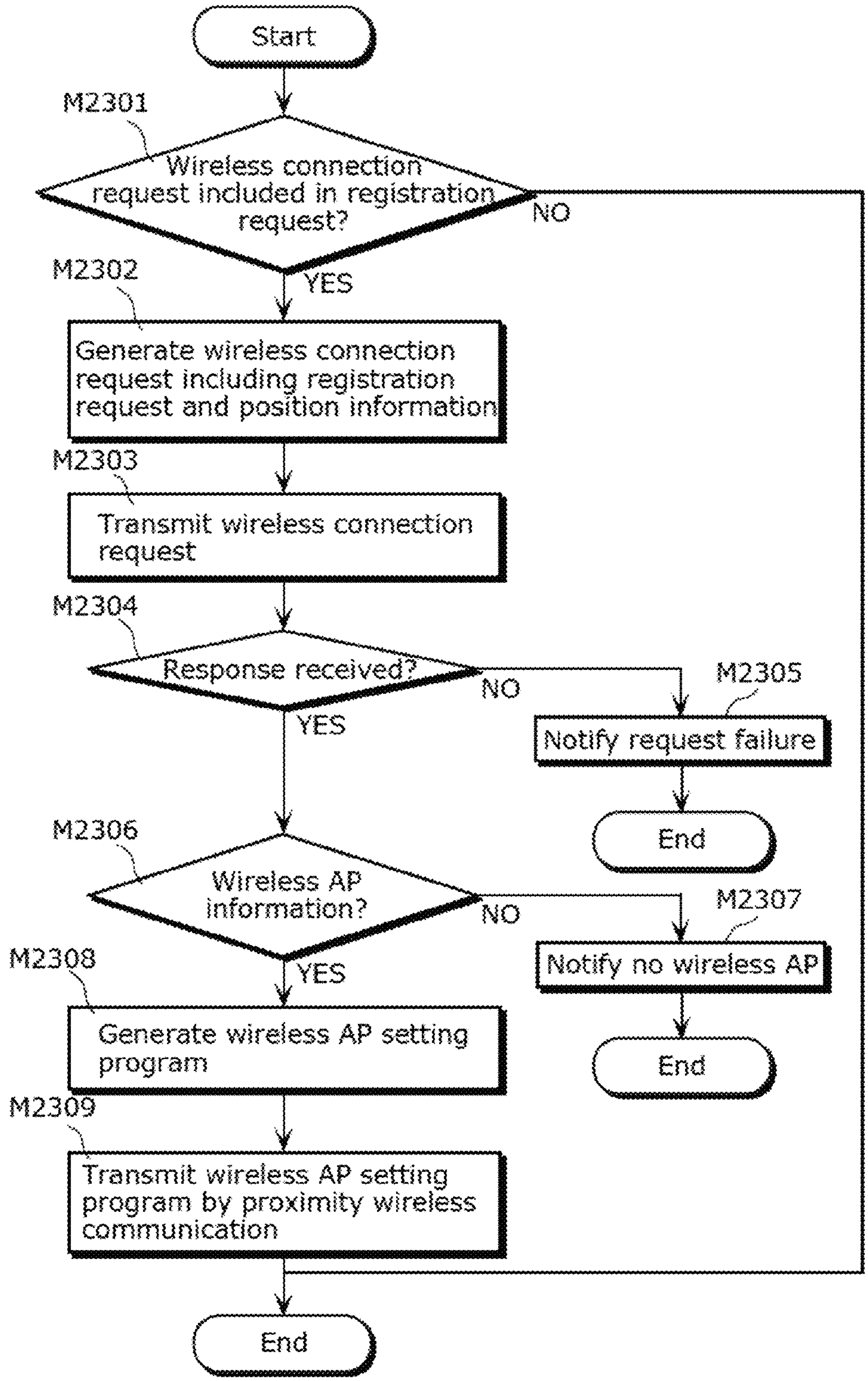

FIG. 475 is a flowchart of the wireless connection request according to Embodiment B6.

Figure 476:
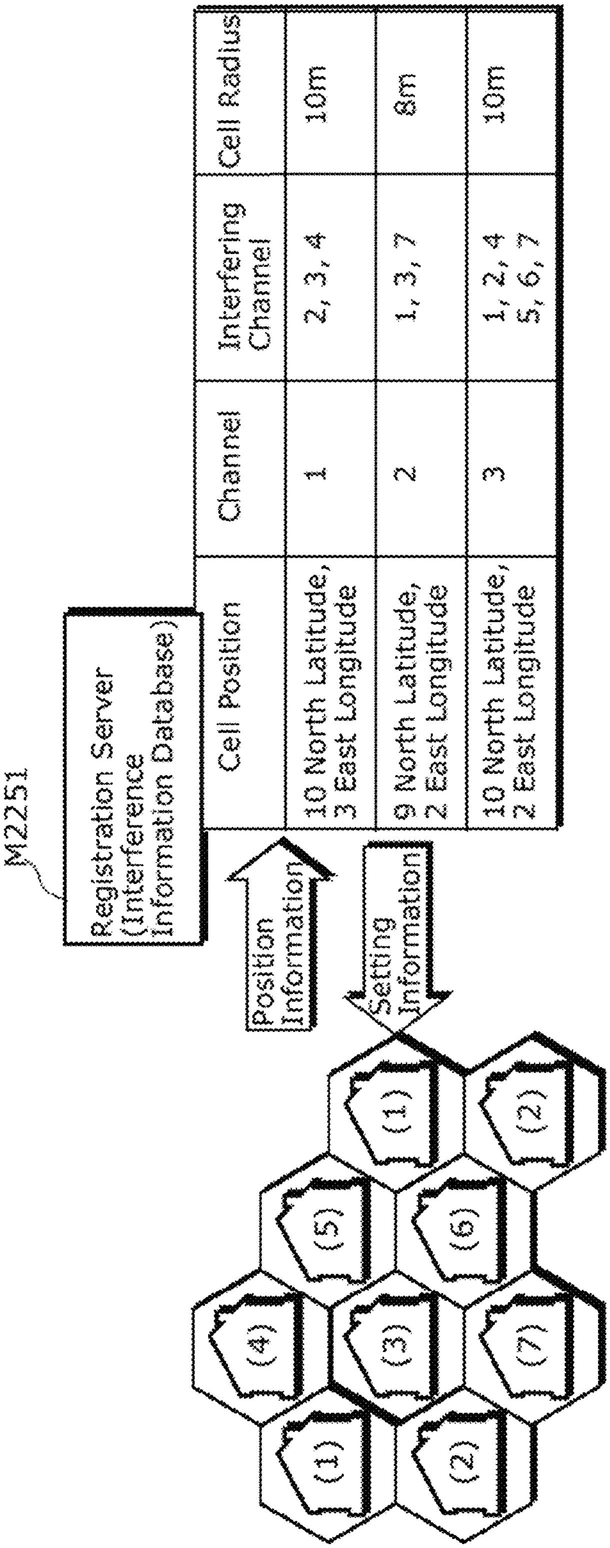

FIG. 476 is a diagram of a network environment for a channel setting request according to Embodiment B7.

Figure 477:
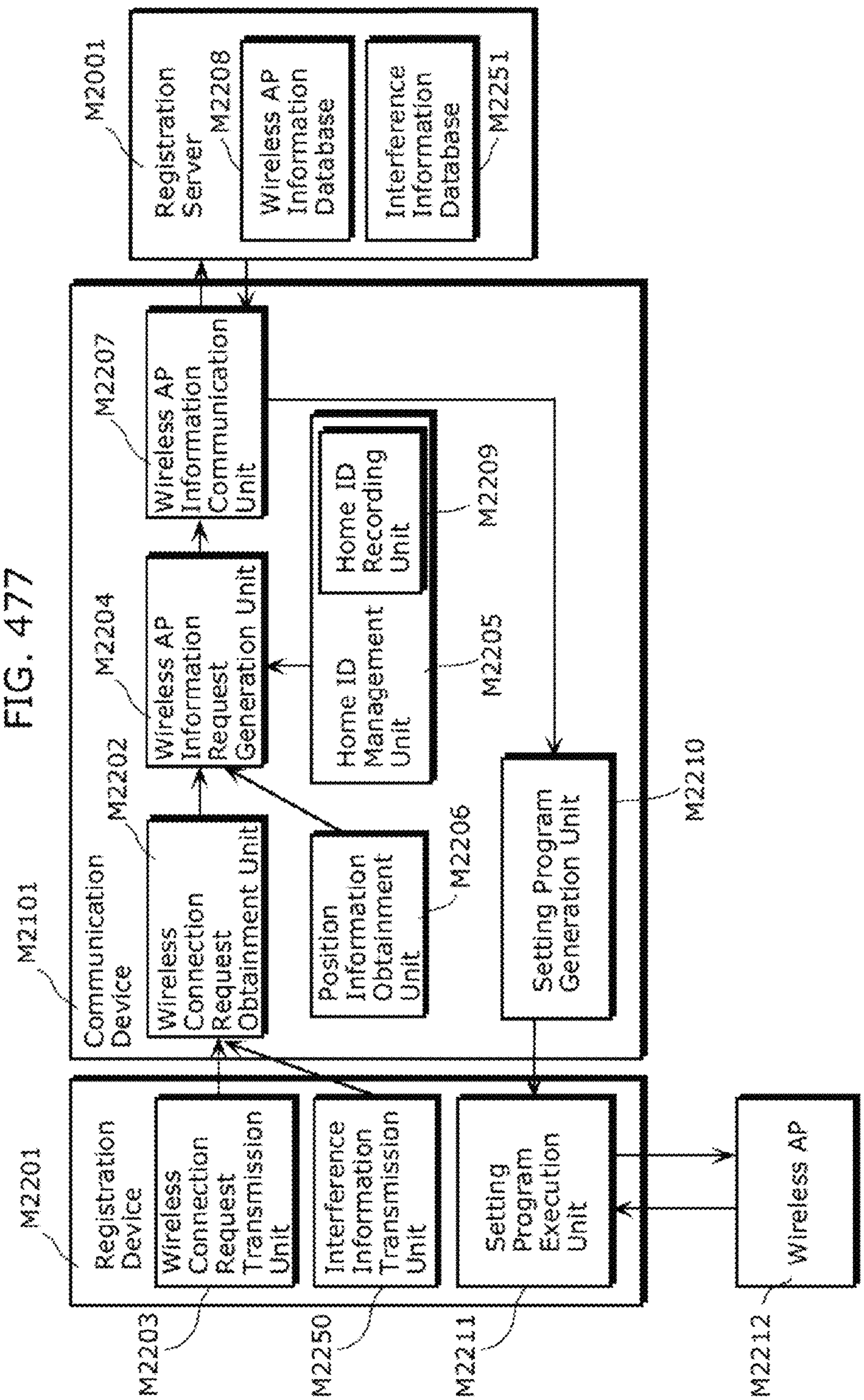

FIG. 477 is a functional block diagram of a communication device for the channel setting request according to Embodiment B7.

Figure 478:
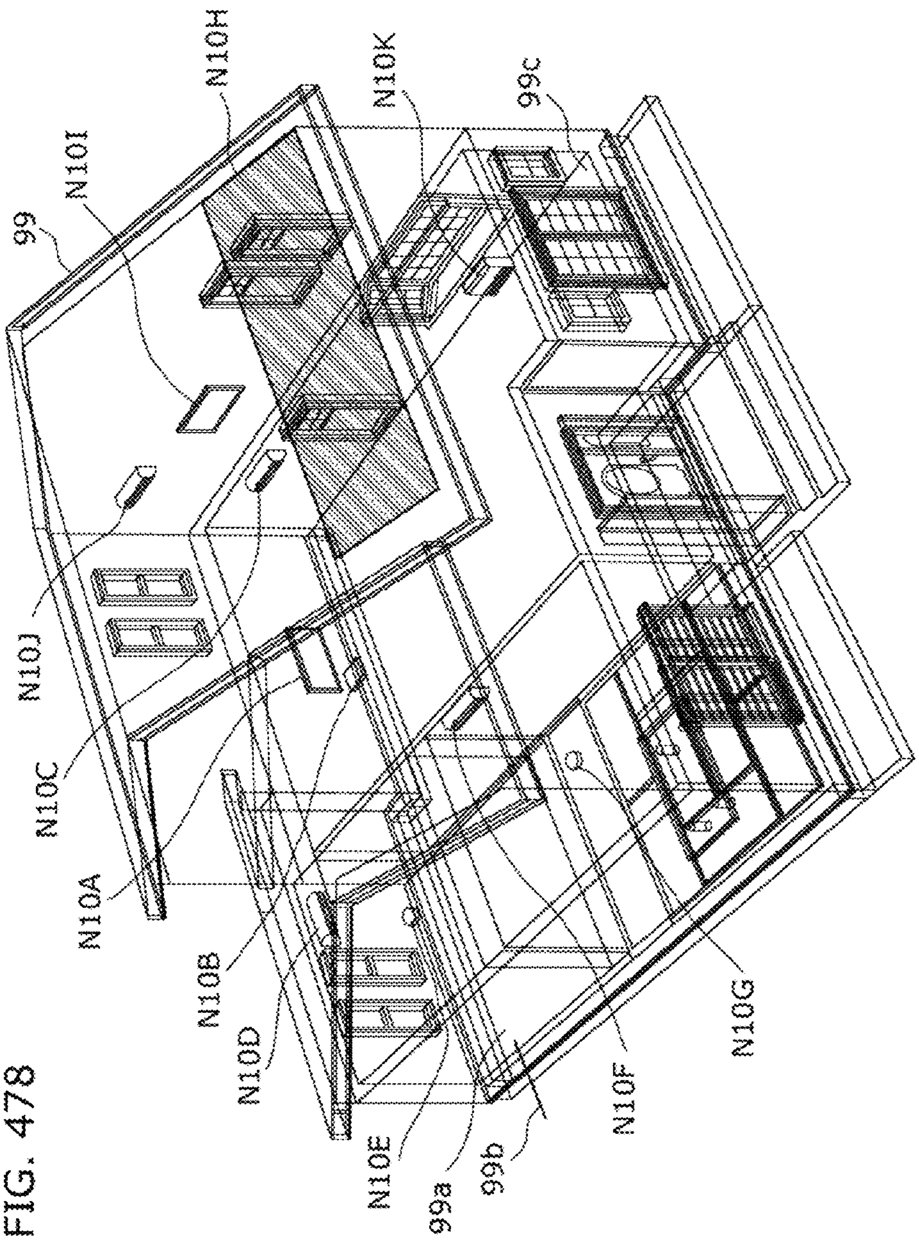

FIG. 478 is a diagram illustrating a home.

Figure 479:
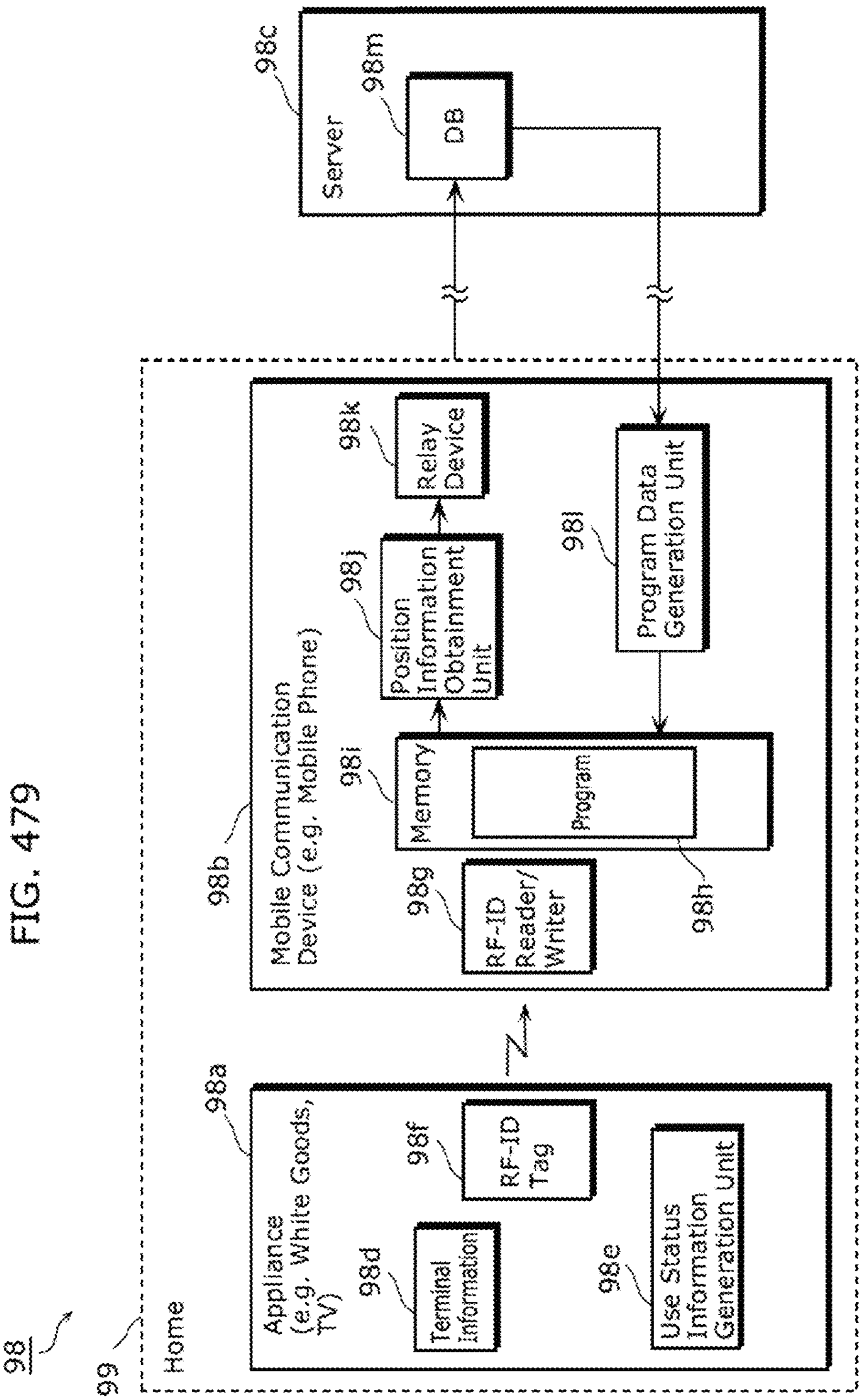

FIG. 479 is a diagram illustrating a system.

Figure 480:
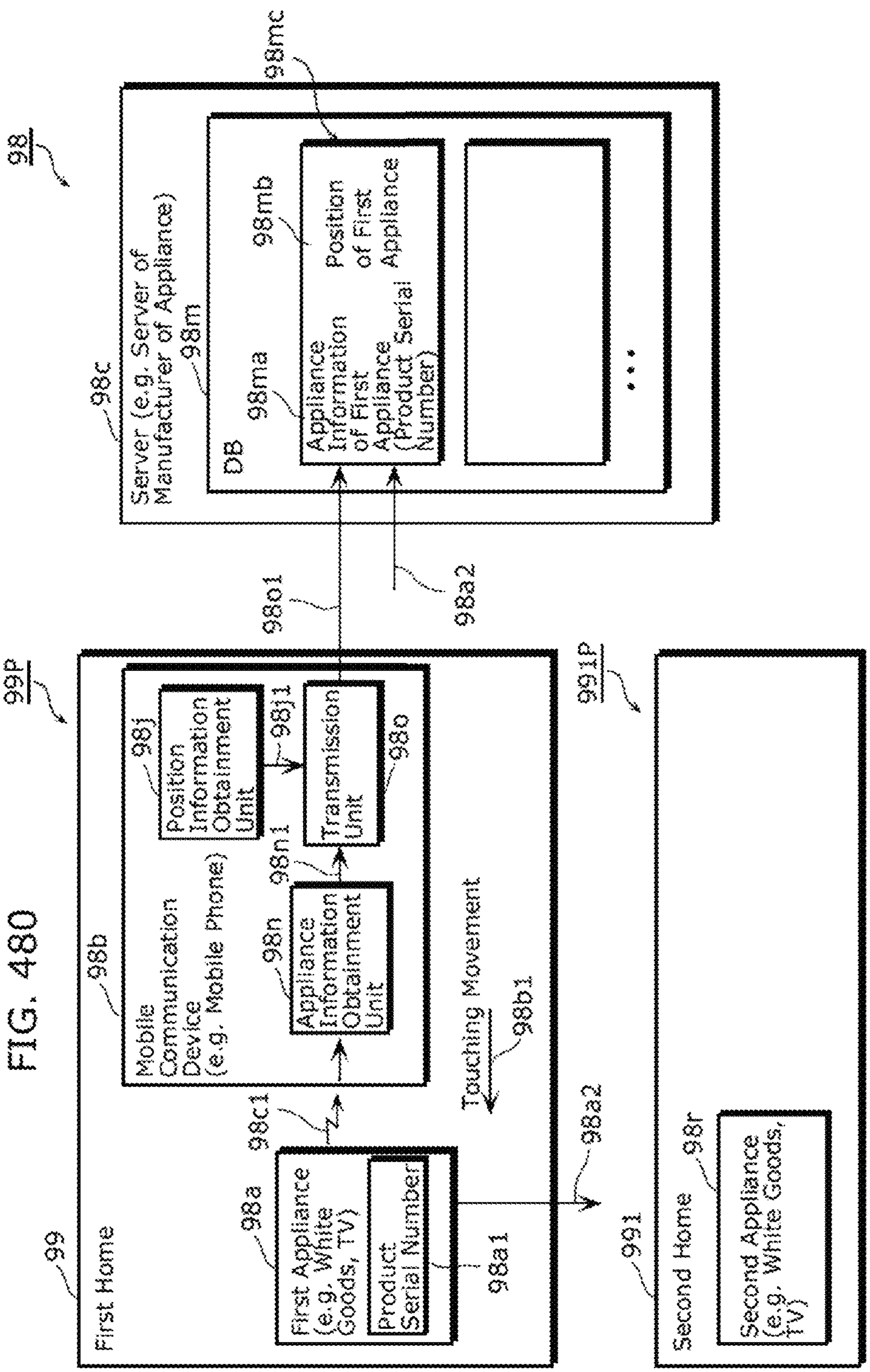

FIG. 480 is a diagram illustrating a system.

Figure 481:
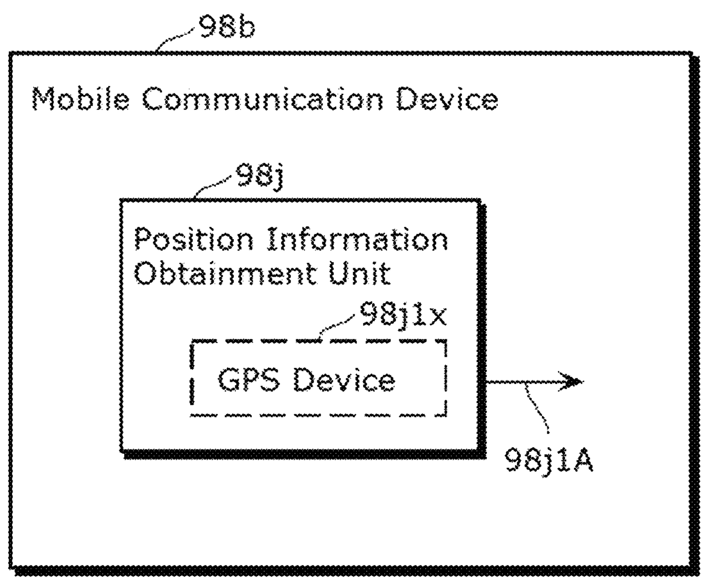

FIG. 481 is a diagram illustrating a mobile communication device.

Figure 482:
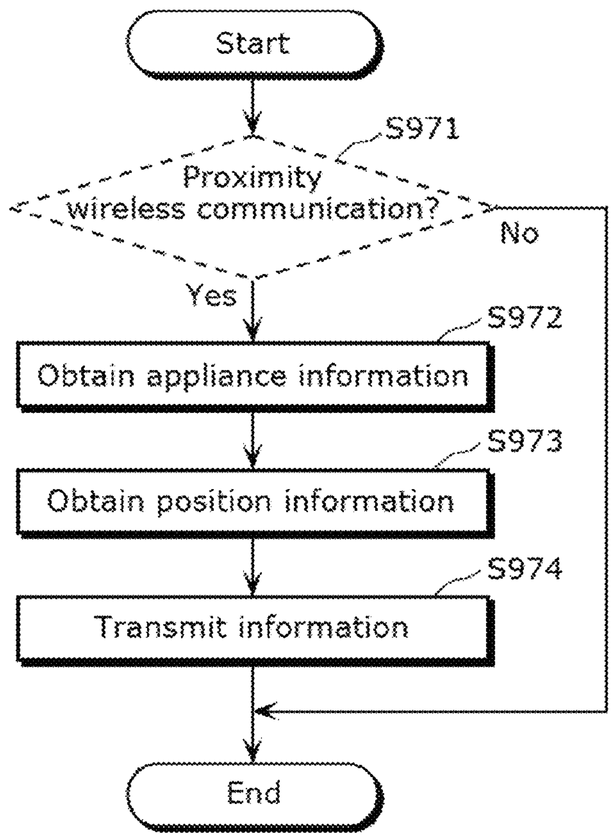

FIG. 482 is a flowchart of the mobile communication device.

Figure 483:
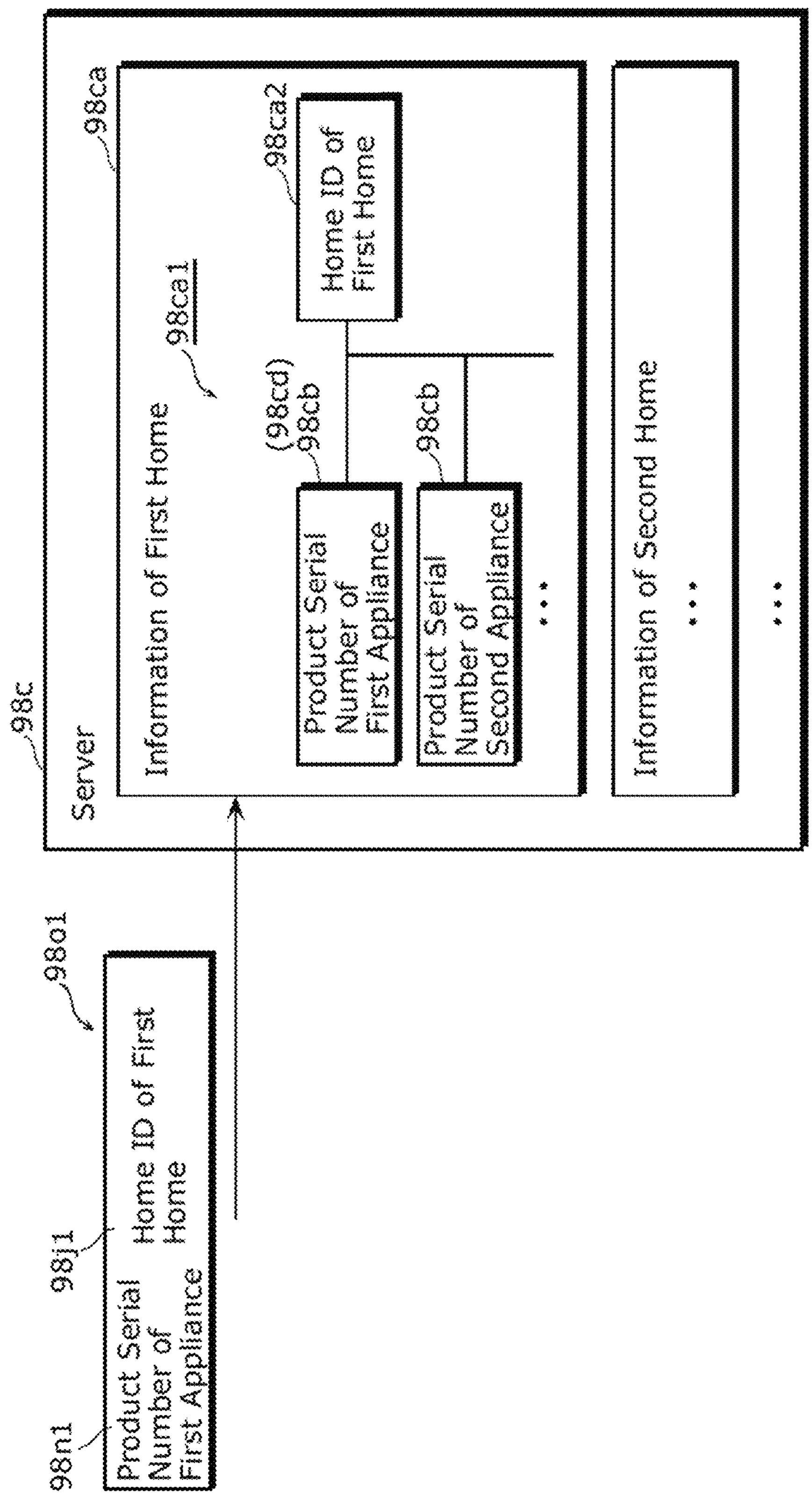

FIG. 483 is a diagram illustrating a server and the like.

Figure 484:
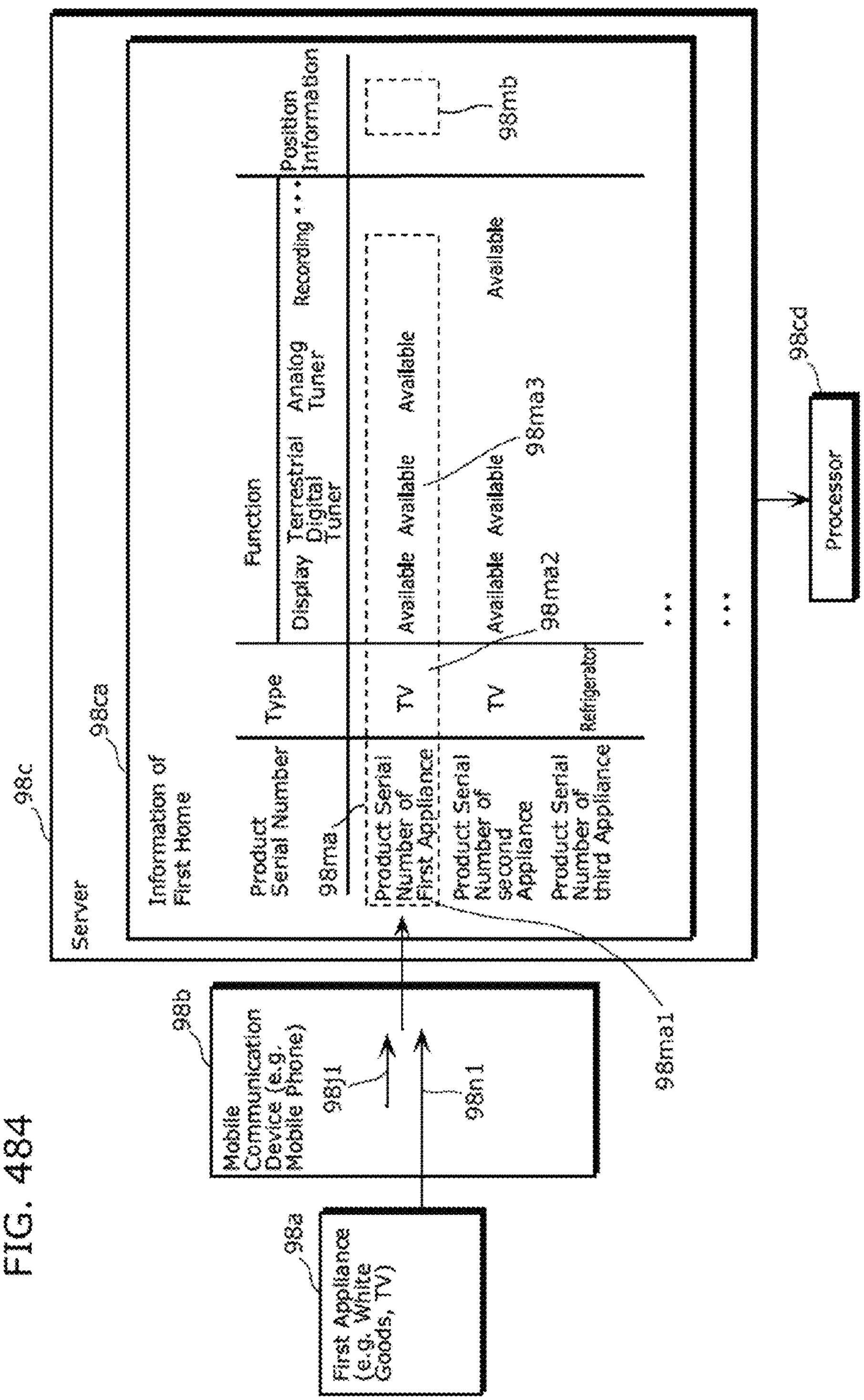

FIG. 484 is a diagram illustrating appliance information, type information, function information, and the like.

Figure 485:
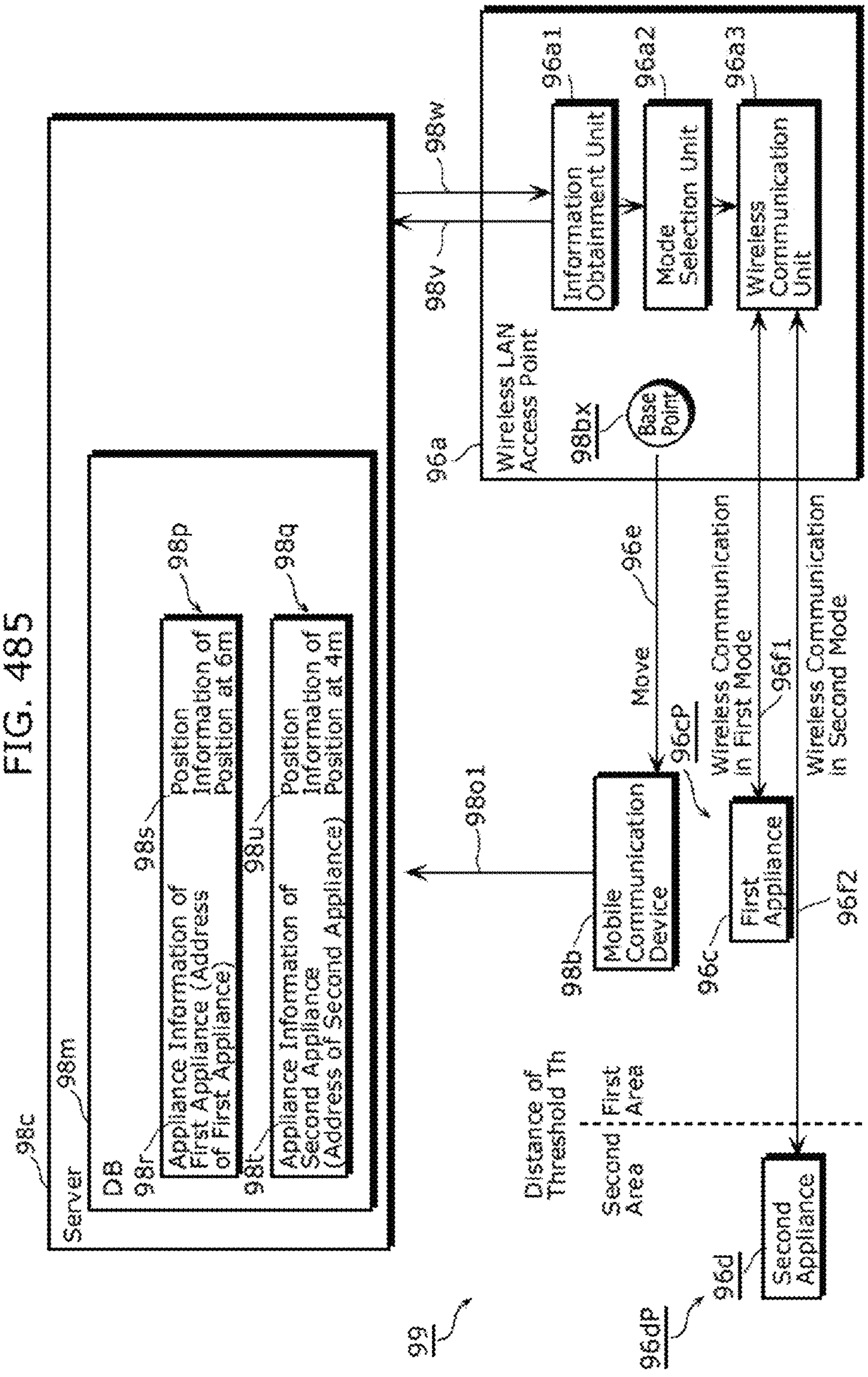

FIG. 485 is a diagram illustrating a wireless LAN access point and the like.

Figure 486:
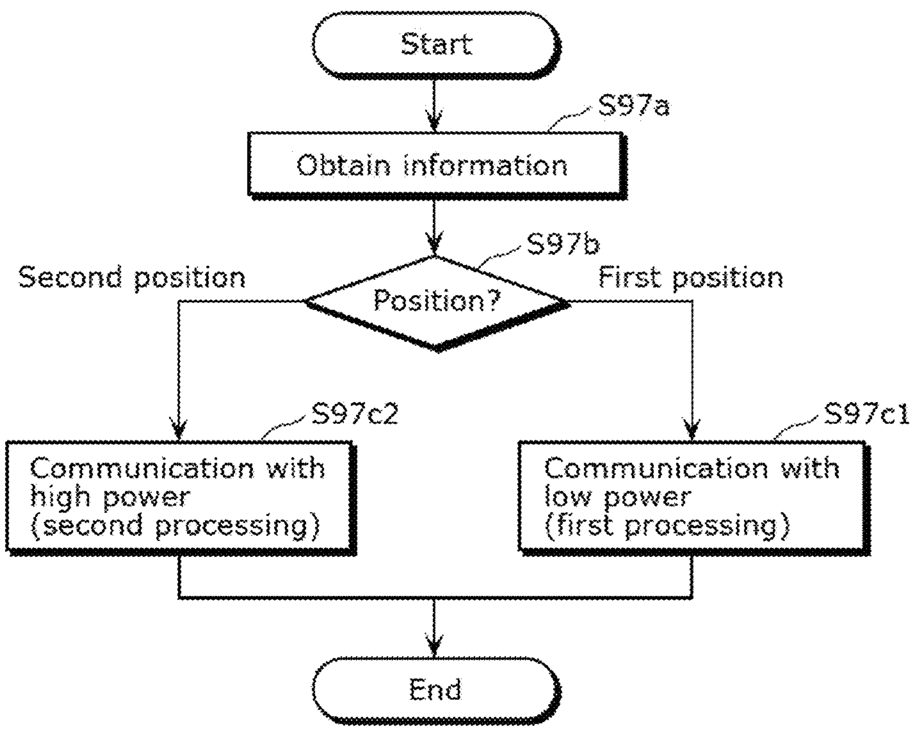

FIG. 486 is a flowchart of processing of wireless communication.

Figure 487:
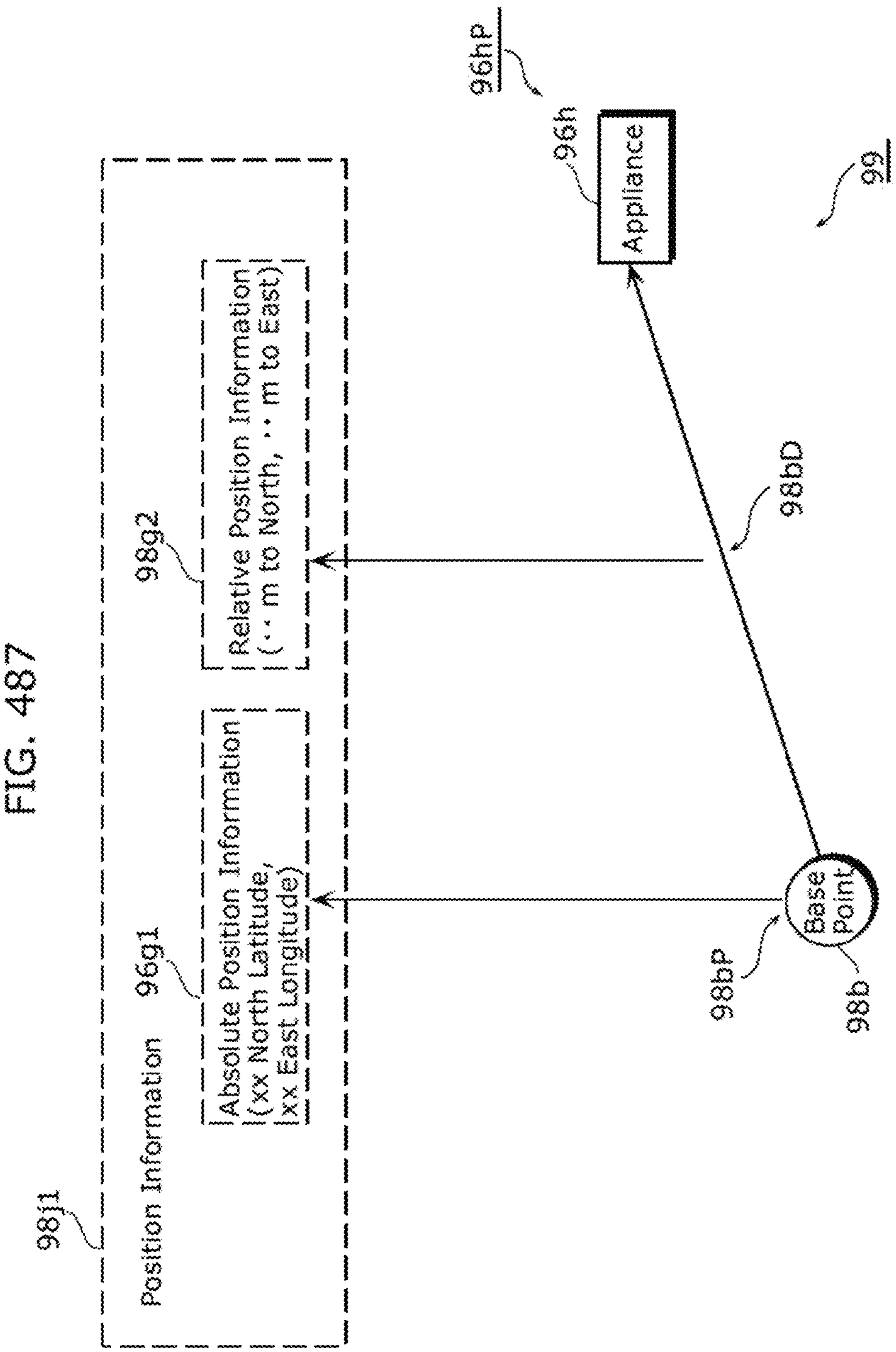

FIG. 487 is a diagram illustrating position information and the like.

Figure 488:
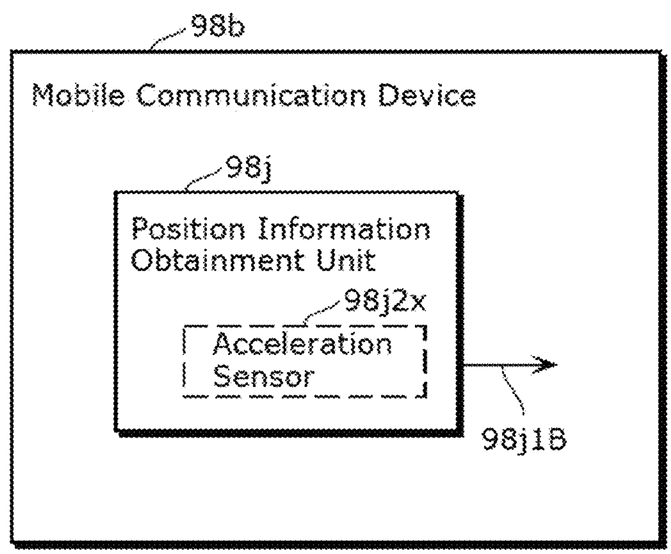

FIG. 488 is a diagram illustrating a mobile communication device.

Figure 489:
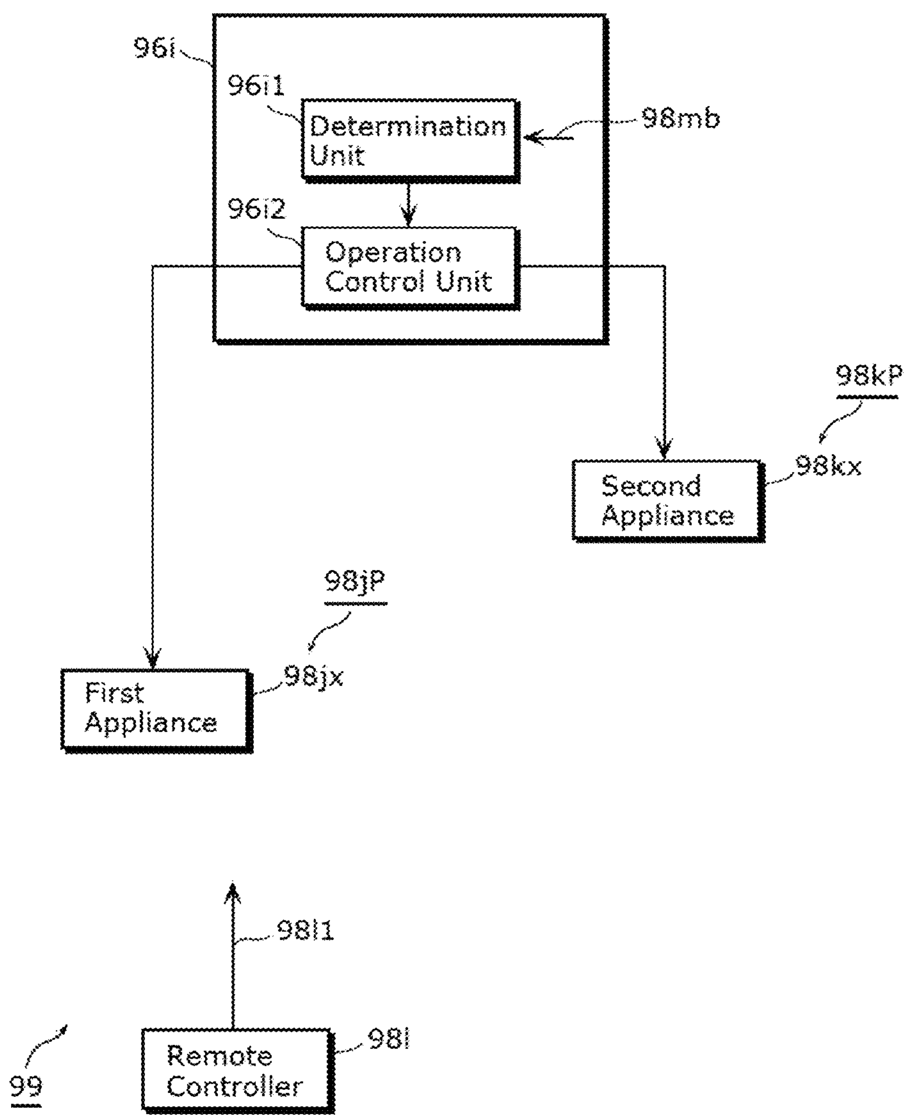

FIG. 489 is a diagram illustrating a remote controller and the like.

Figure 490:
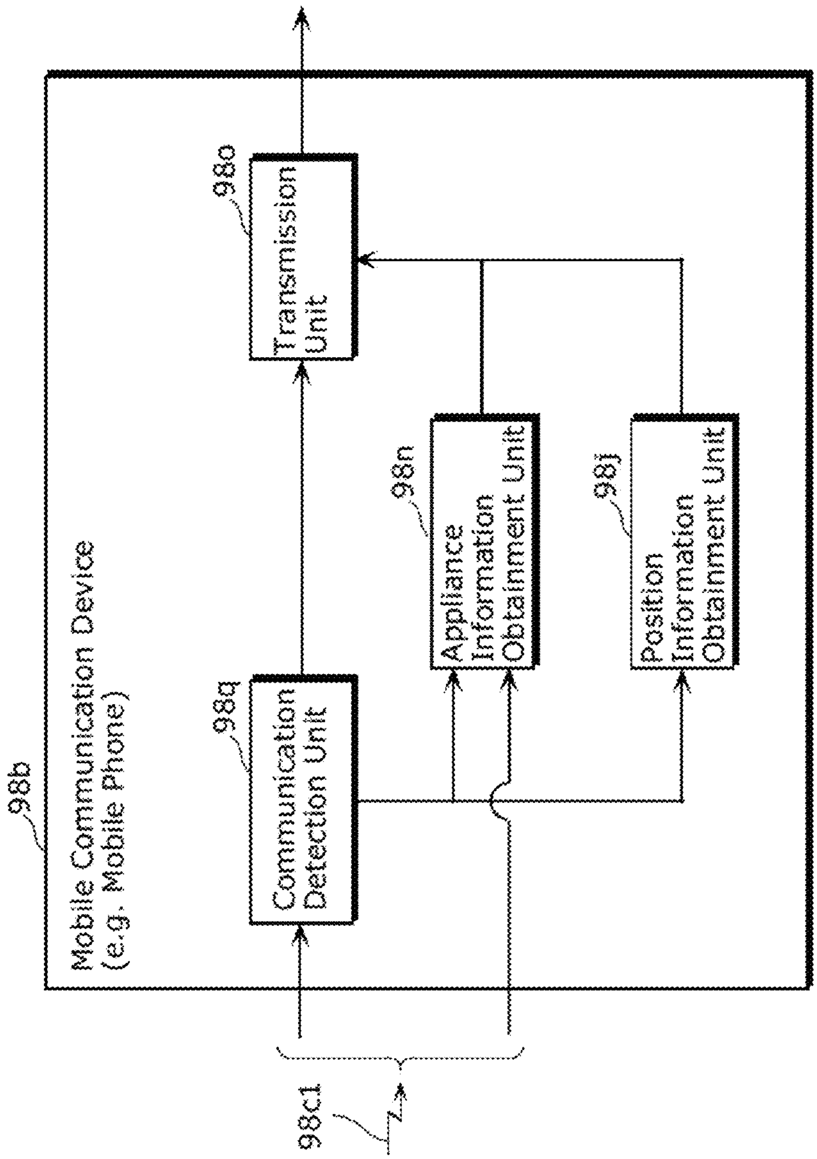

FIG. 490 is a diagram illustrating a mobile communication device.

Figure 491:
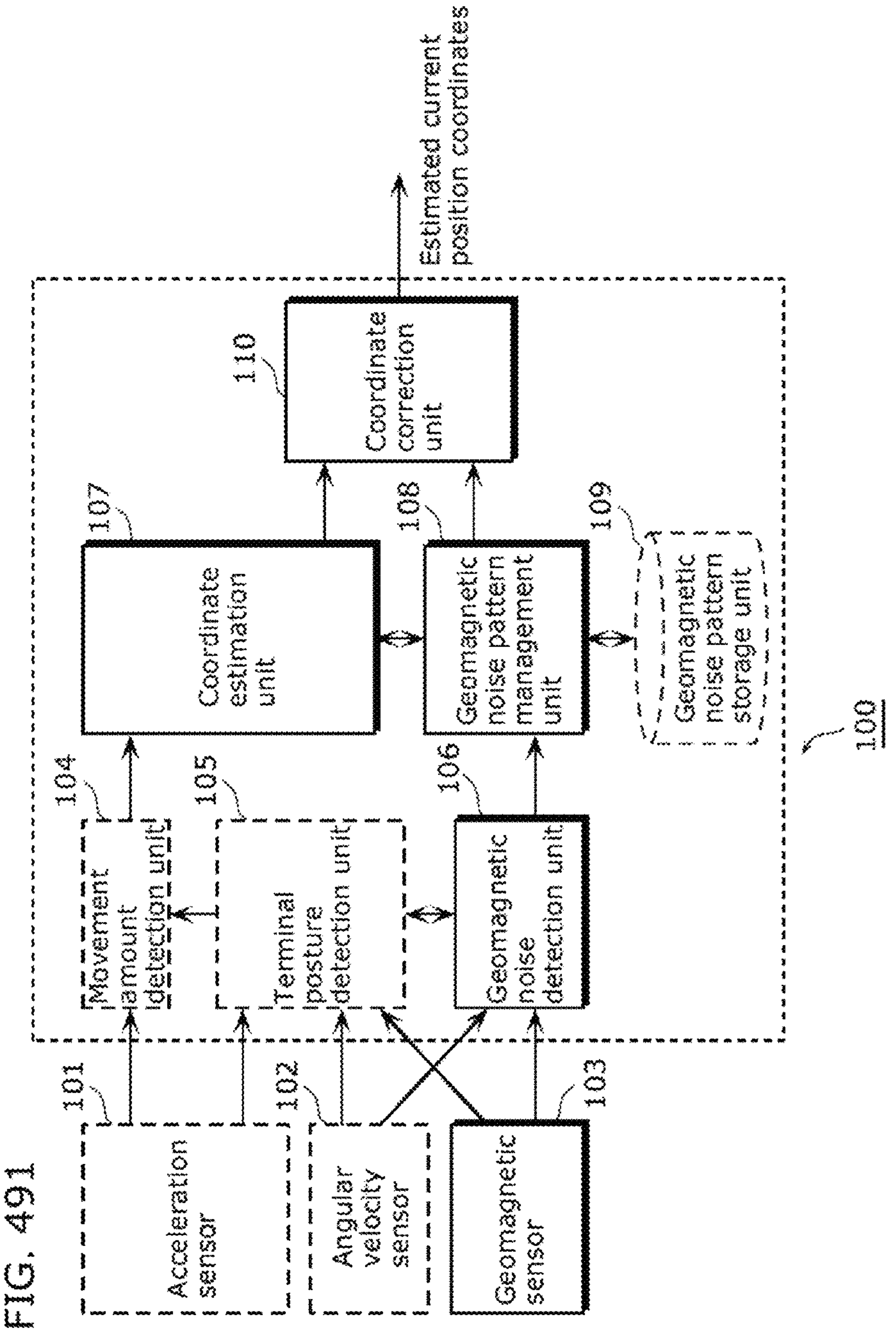

FIG. 491 is a functional block diagram of a position detection device according to Embodiment C of the present invention.

FIG. 492 is a diagram showing a table in a geomagnetic noise pattern storage unit according to Embodiment C of the present invention.

Figure 493:
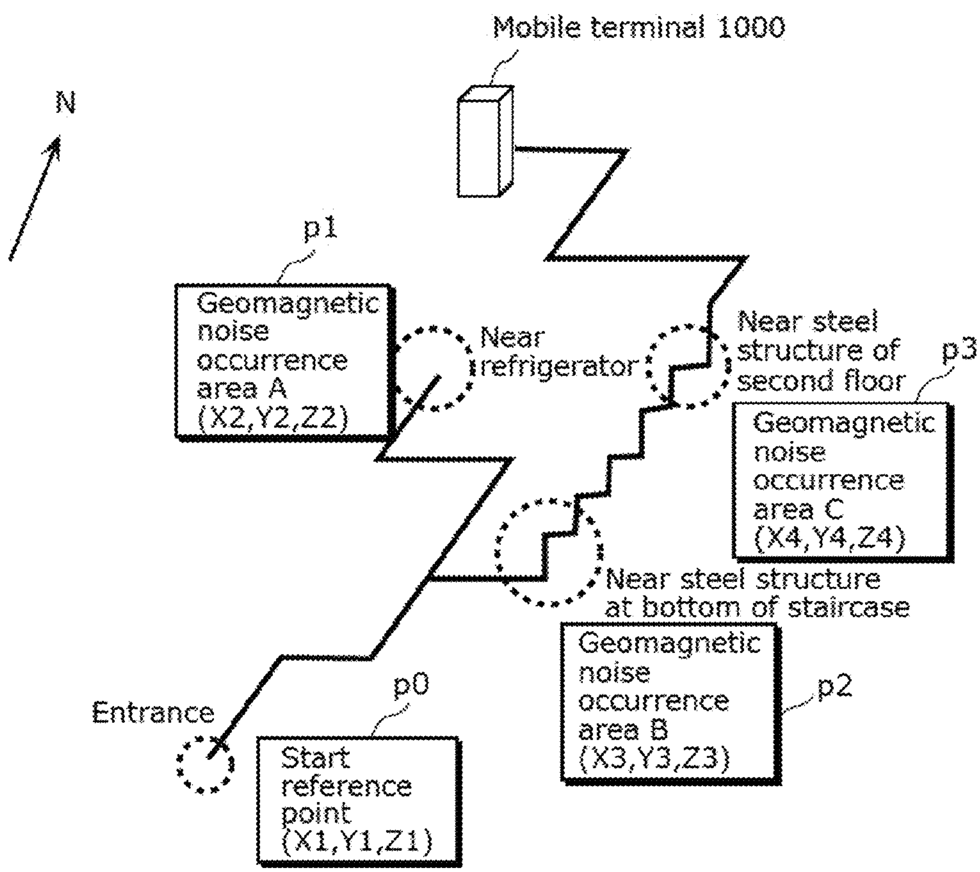

FIG. 493 is a diagram showing an example of geomagnetic noise occurrence areas in a home according to Embodiment C of the present invention.

Figure 494:
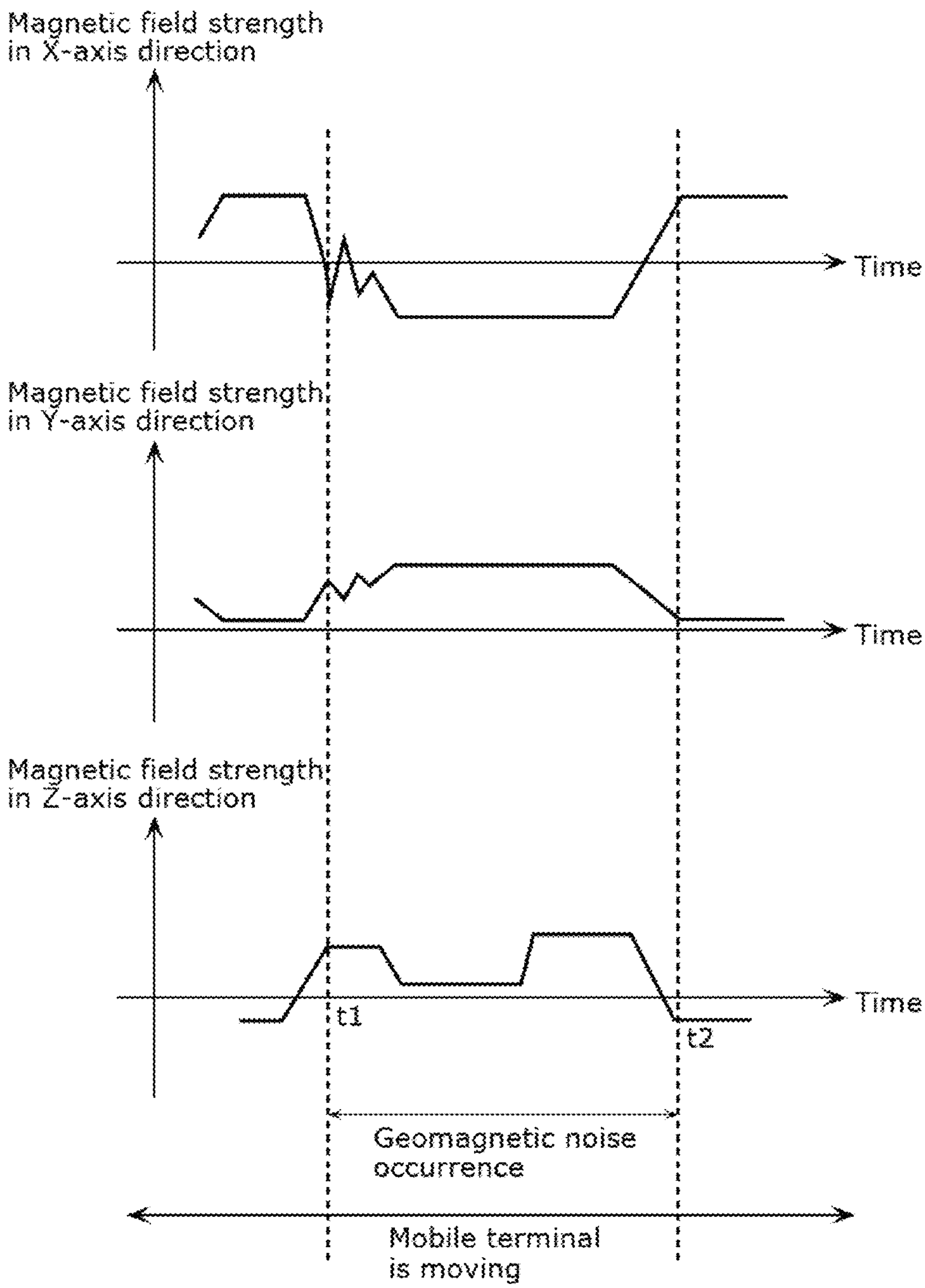

FIG. 494 is a diagram showing an example of an occurring geomagnetic noise pattern according to Embodiment C of the present invention.

Figure 495:
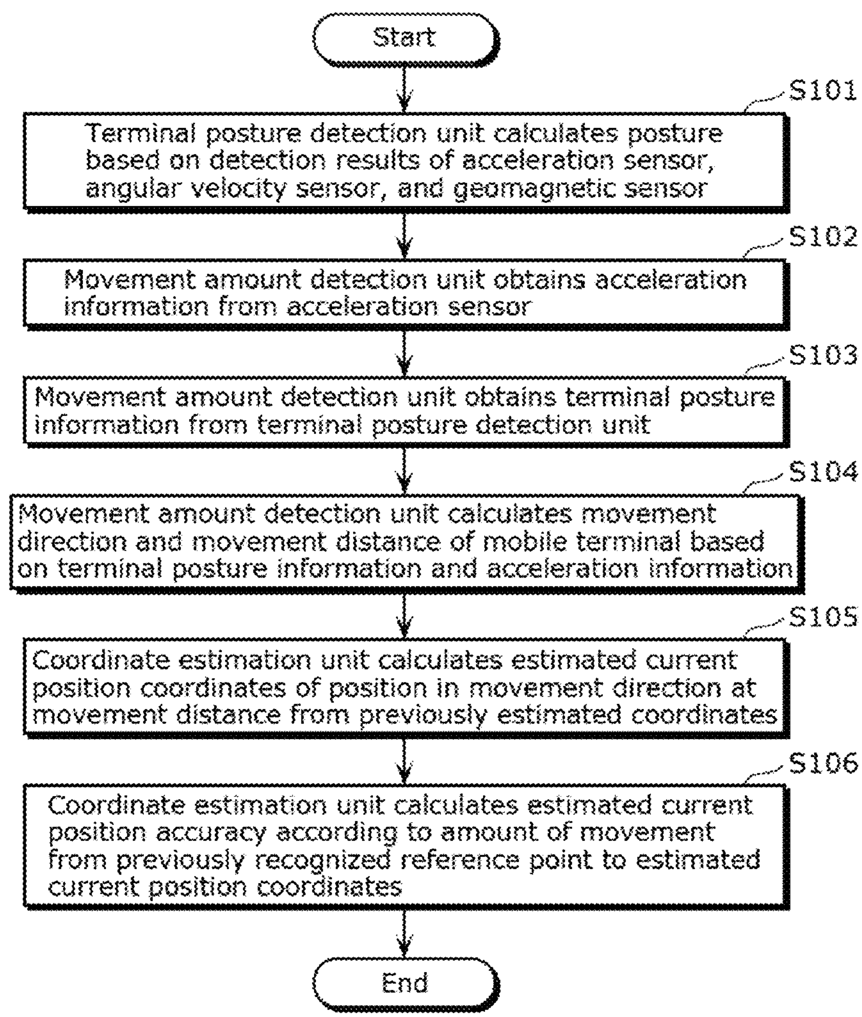

FIG. 495 is a flowchart showing flow of a process relating to coordinate estimation by the position detection device according to Embodiment C of the present invention.

Figure 496:
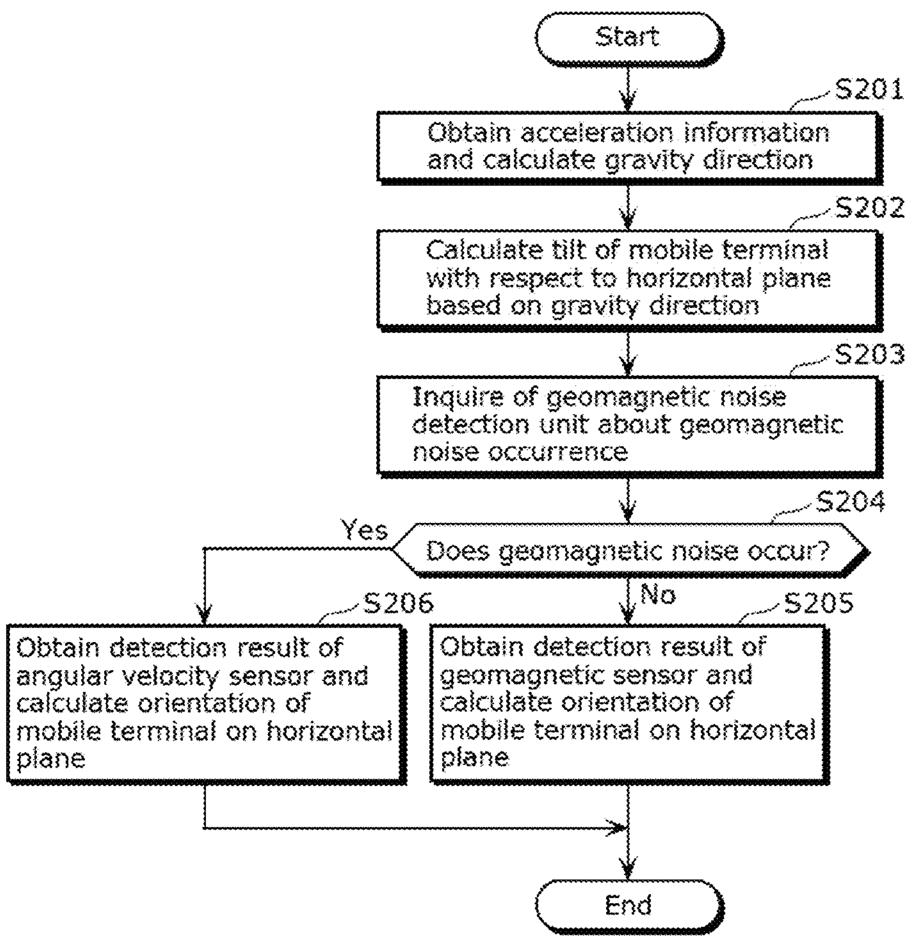

FIG. 496 is a flowchart showing flow of a process by a terminal posture detection unit according to Embodiment C of the present invention.

Figure 497:
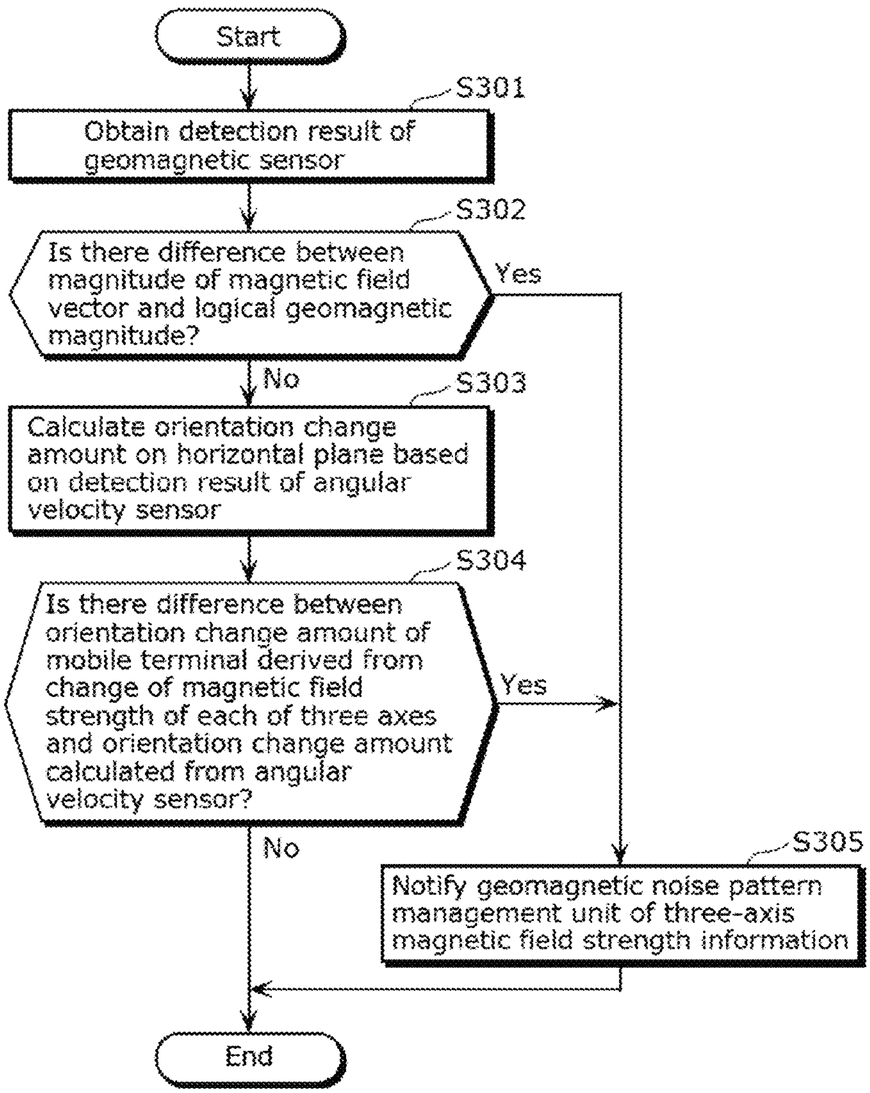

FIG. 497 is a flowchart showing flow of a process by a geomagnetic noise detection unit according to Embodiment C of the present invention.

Figure 498:
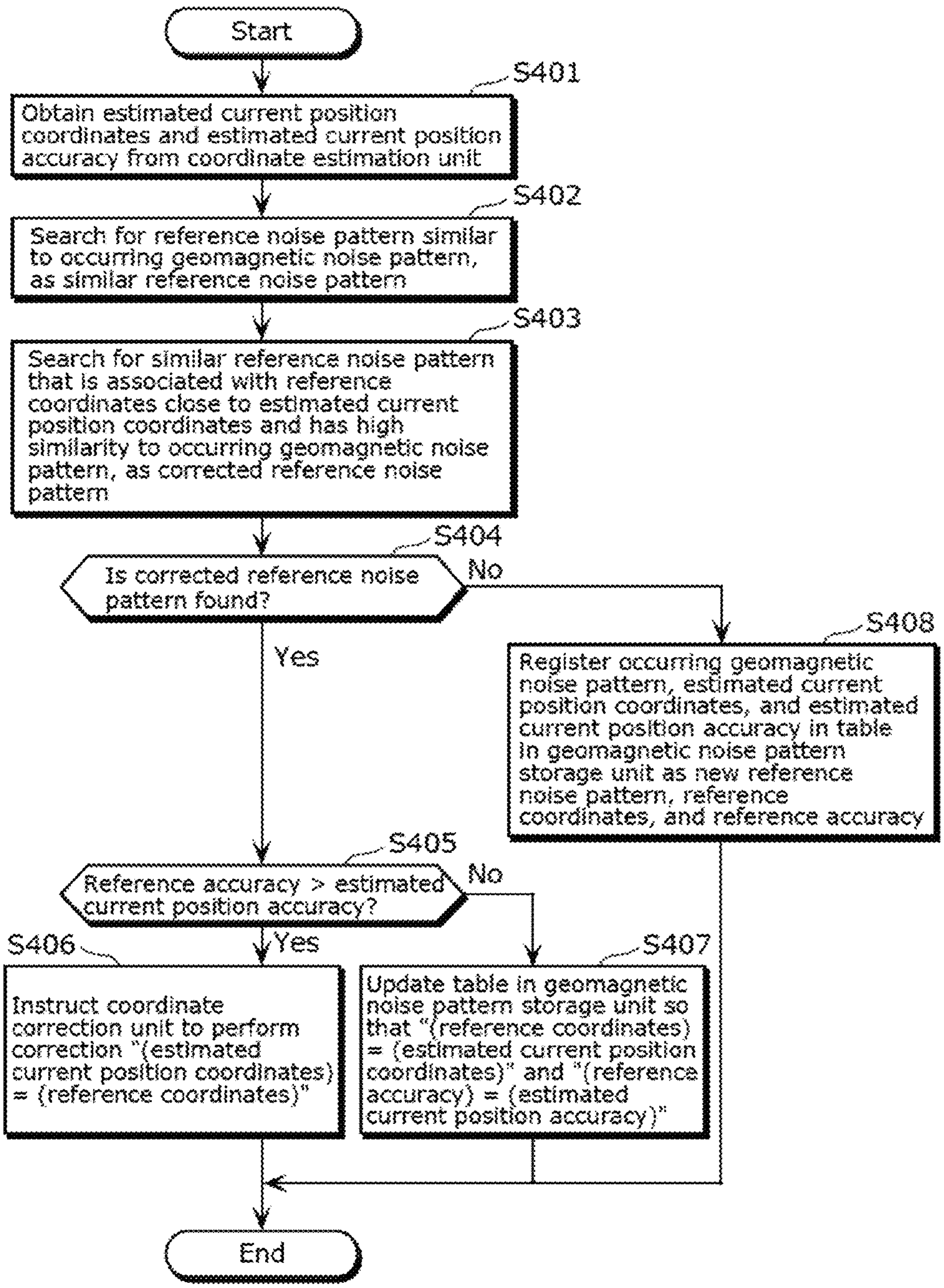

FIG. 498 is a flowchart showing flow of a process by a geomagnetic noise pattern management unit according to Embodiment C of the present invention.

Figure 499:
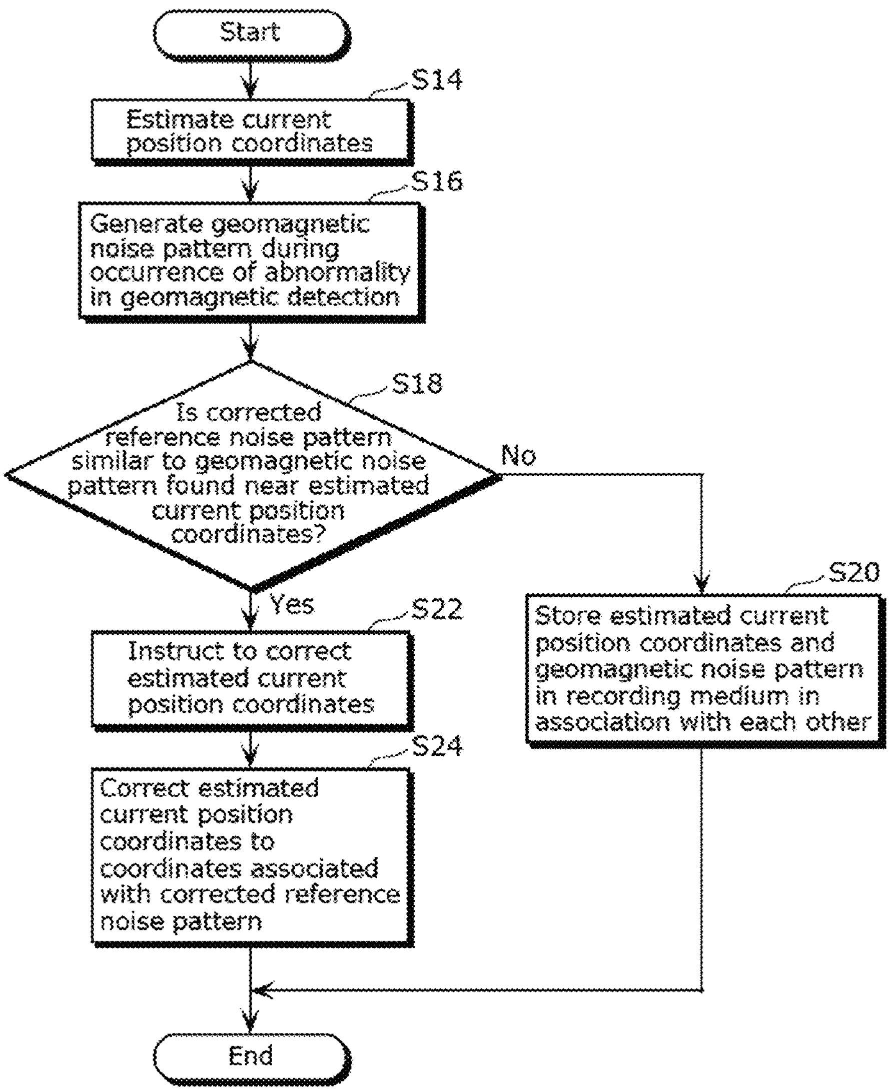

FIG. 499 is a flowchart showing a position detection method according to Embodiment C of the present invention.

FIG. 500 is a diagram showing a table in a geomagnetic noise pattern storage unit according to Variation 1 of Embodiment C of the present invention.

FIG. 501 is a diagram showing a table in a geomagnetic noise pattern storage unit according to Variation 2 of Embodiment C of the present invention.

Figure 502:
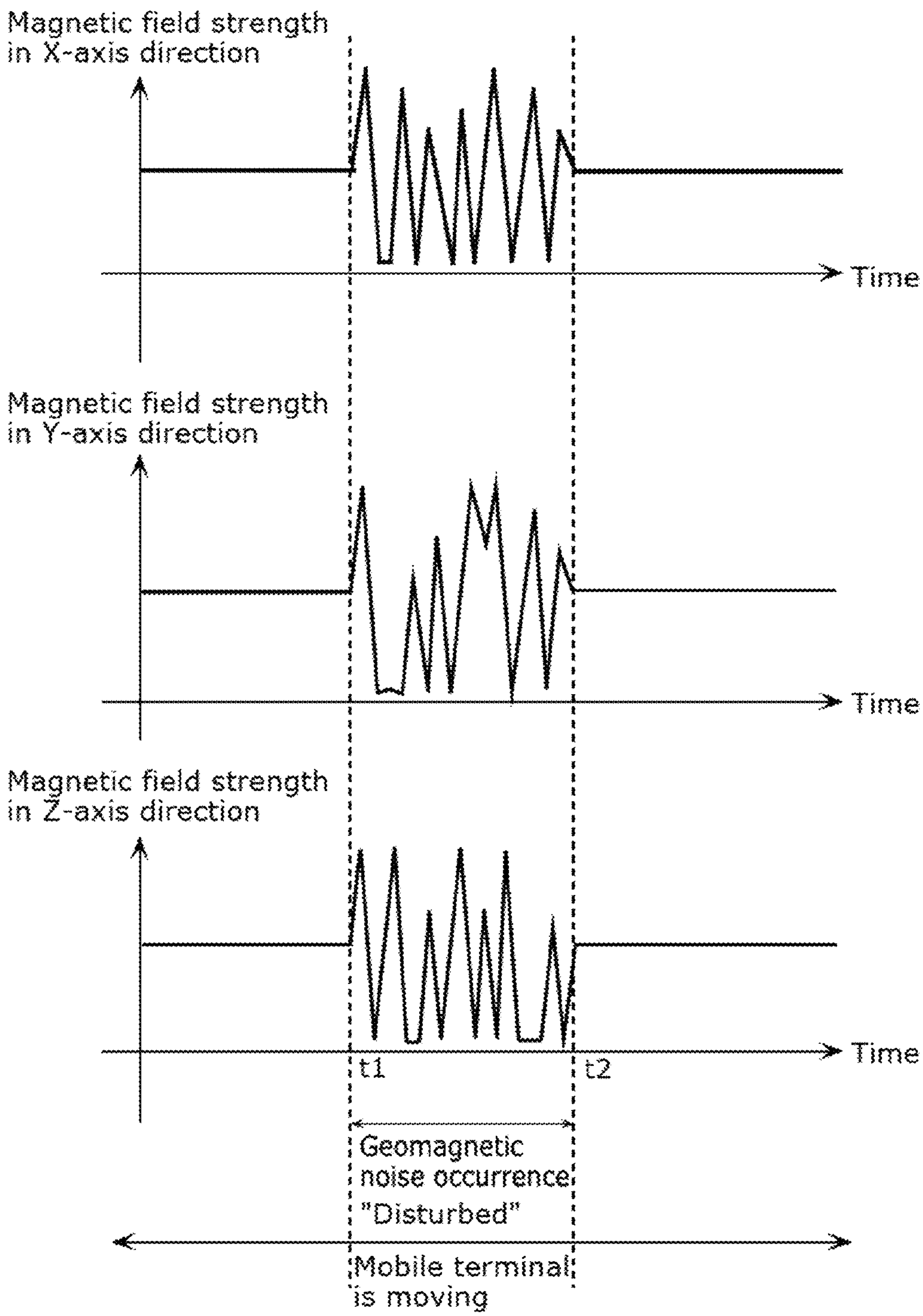

FIG. 502 is a diagram showing an example of an occurring geomagnetic noise pattern according to Variation 3 of Embodiment C of the present invention.

FIG. 503 is a diagram showing a table in a geomagnetic noise pattern storage unit according to Variation 3 of Embodiment C of the present invention.

Figure 504:
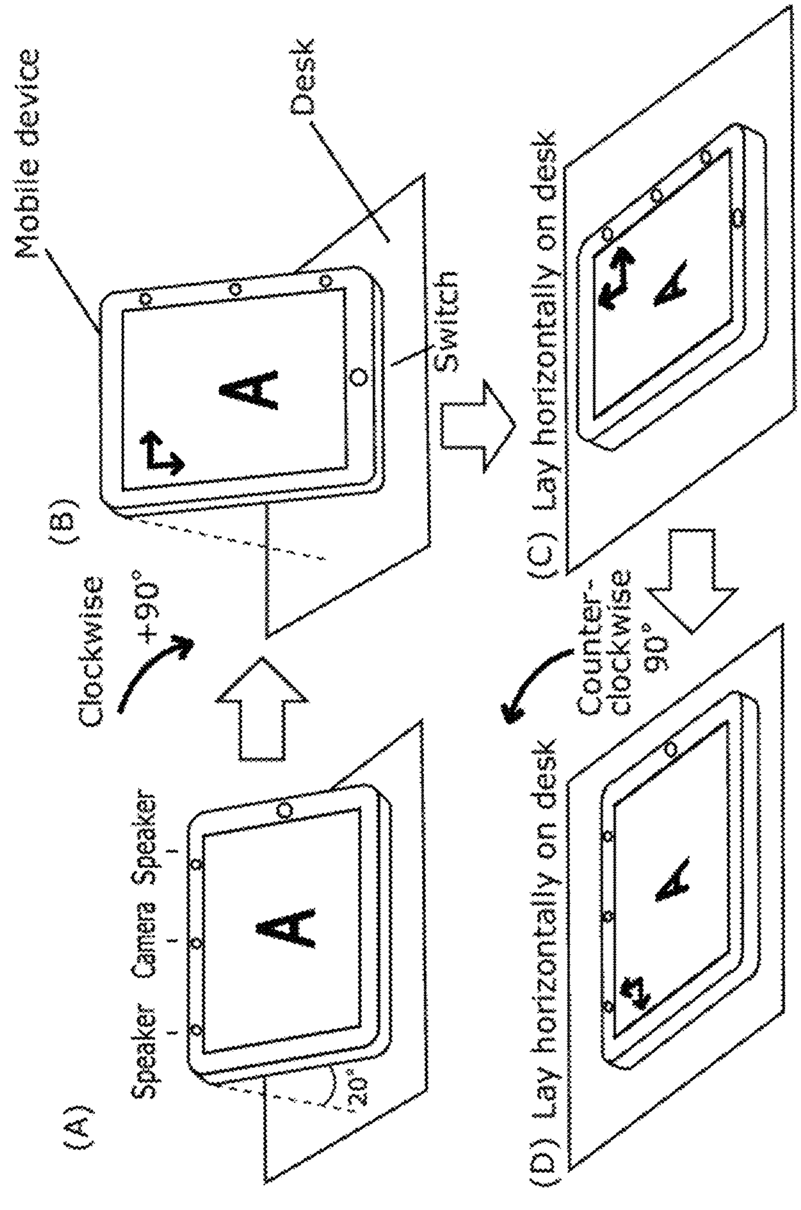

FIG. 504 is a diagram showing a relationship between a posture and a screen display orientation of an information display device according to Embodiment D1 of the present invention.

Figure 505:
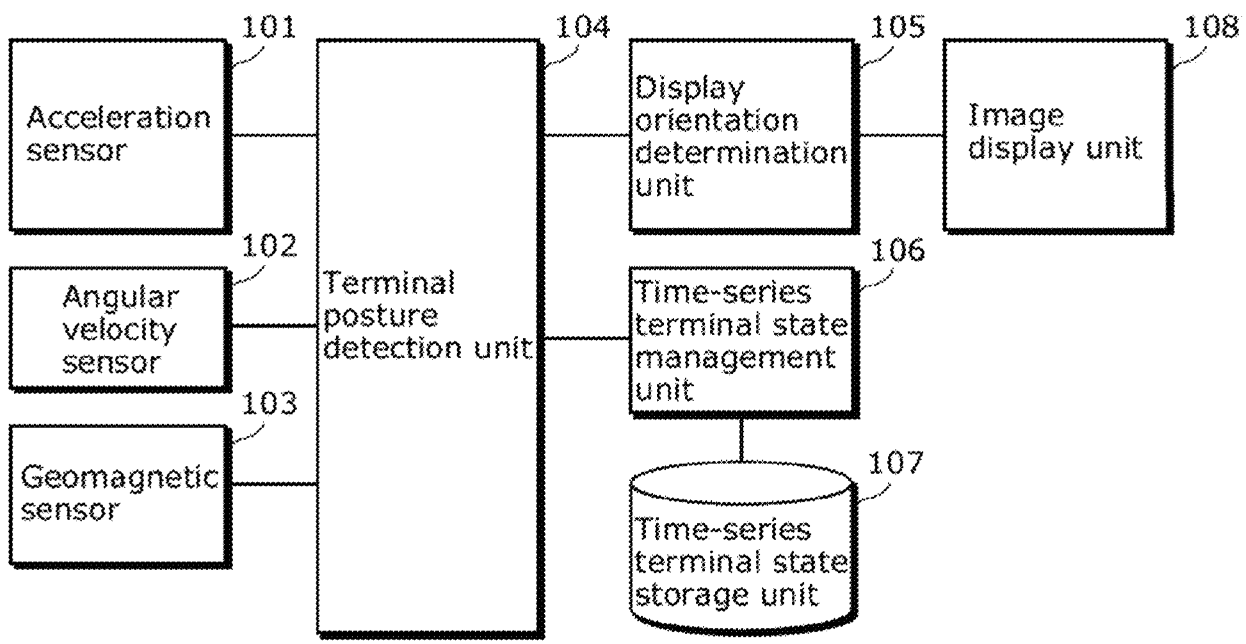

FIG. 505 is a diagram showing an internal structure of a processing unit that determines the screen display orientation of the information display device according to Embodiment D1 of the present invention.

Figure 506:
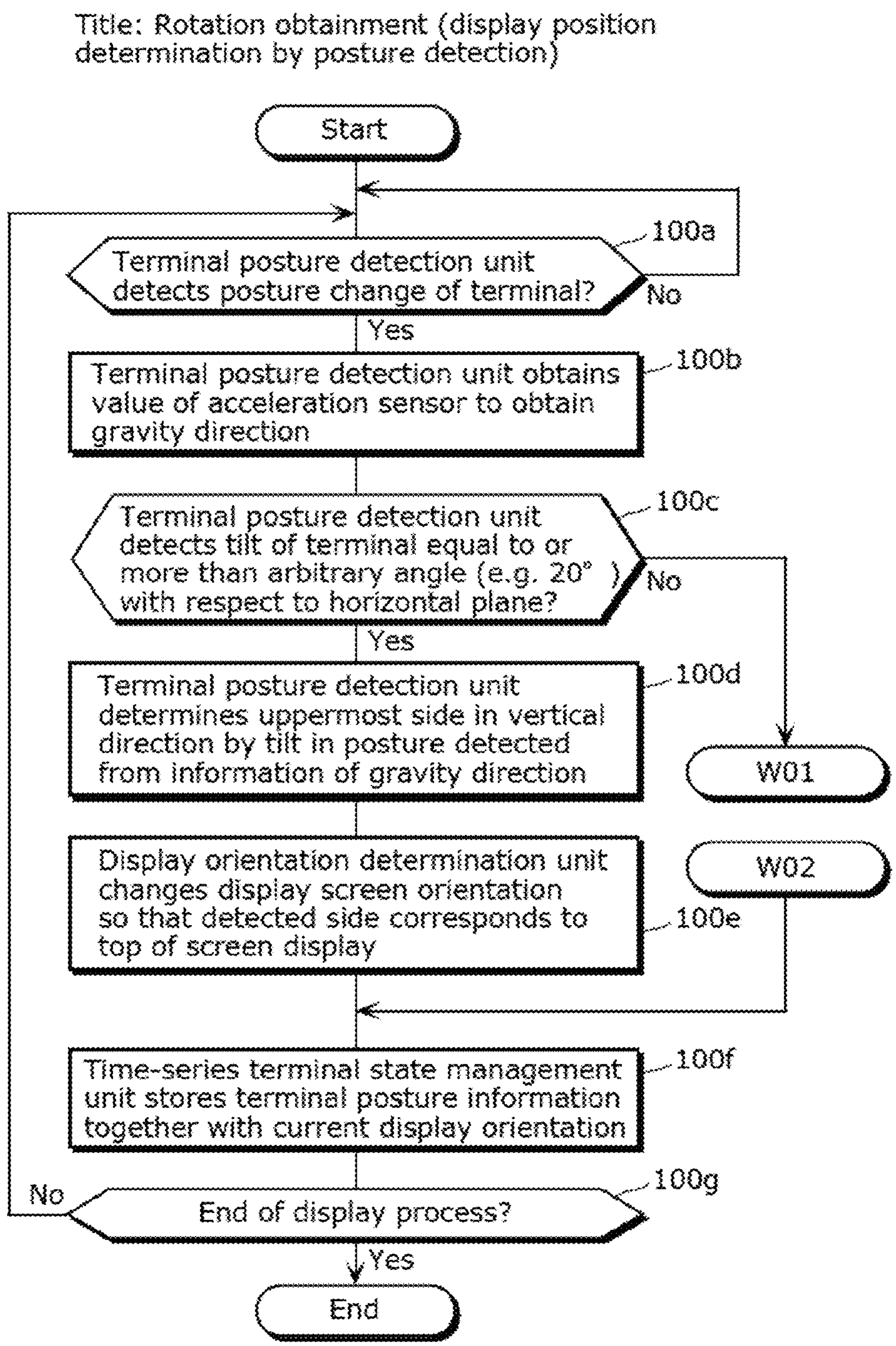

FIG. 506 is a diagram showing process flow of the information display device according to Embodiment D1 of the present invention.

Figure 507:
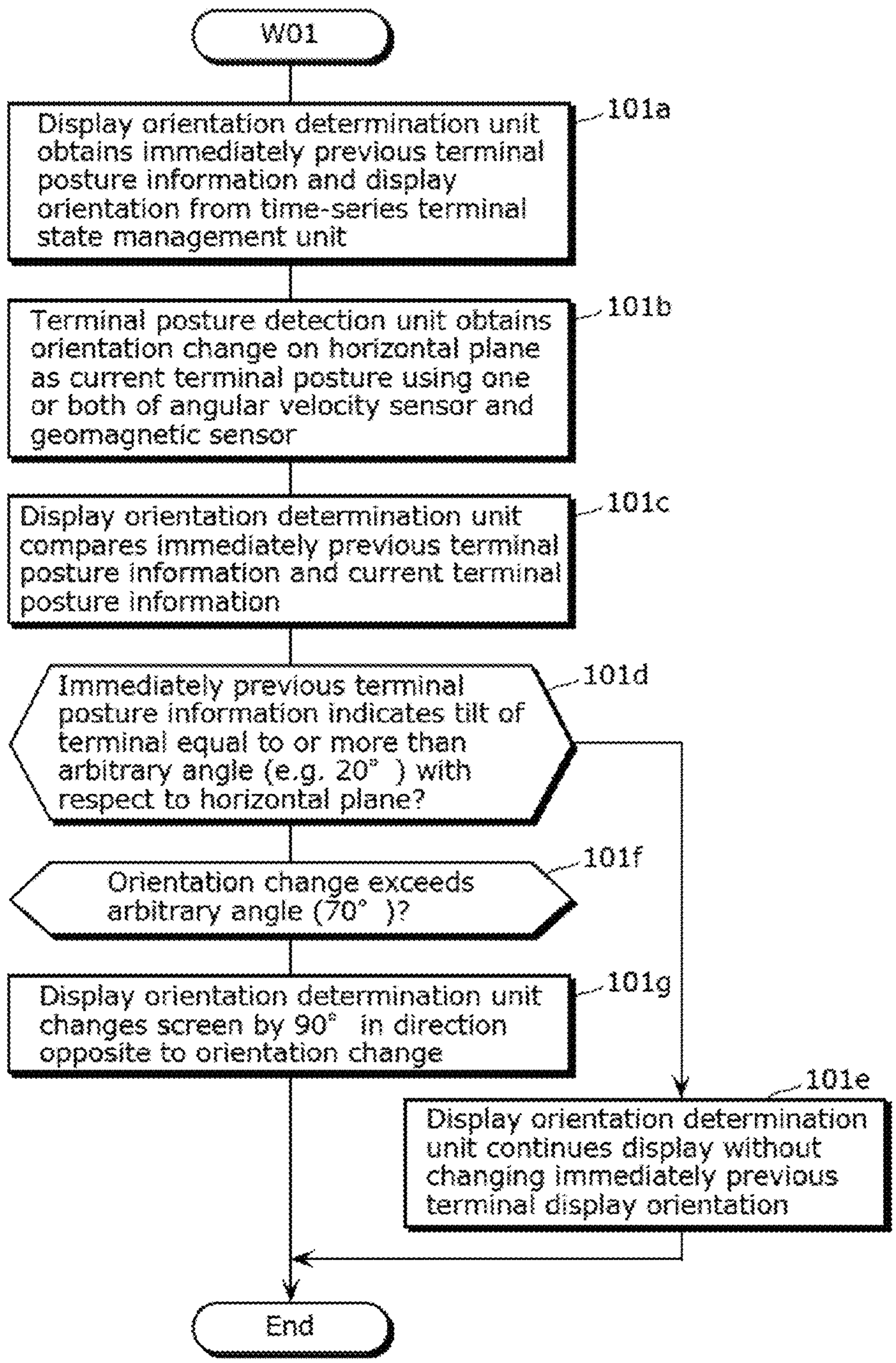

FIG. 507 is a diagram showing process flow of the information display device according to Embodiment D1 of the present invention.

Figure 508:
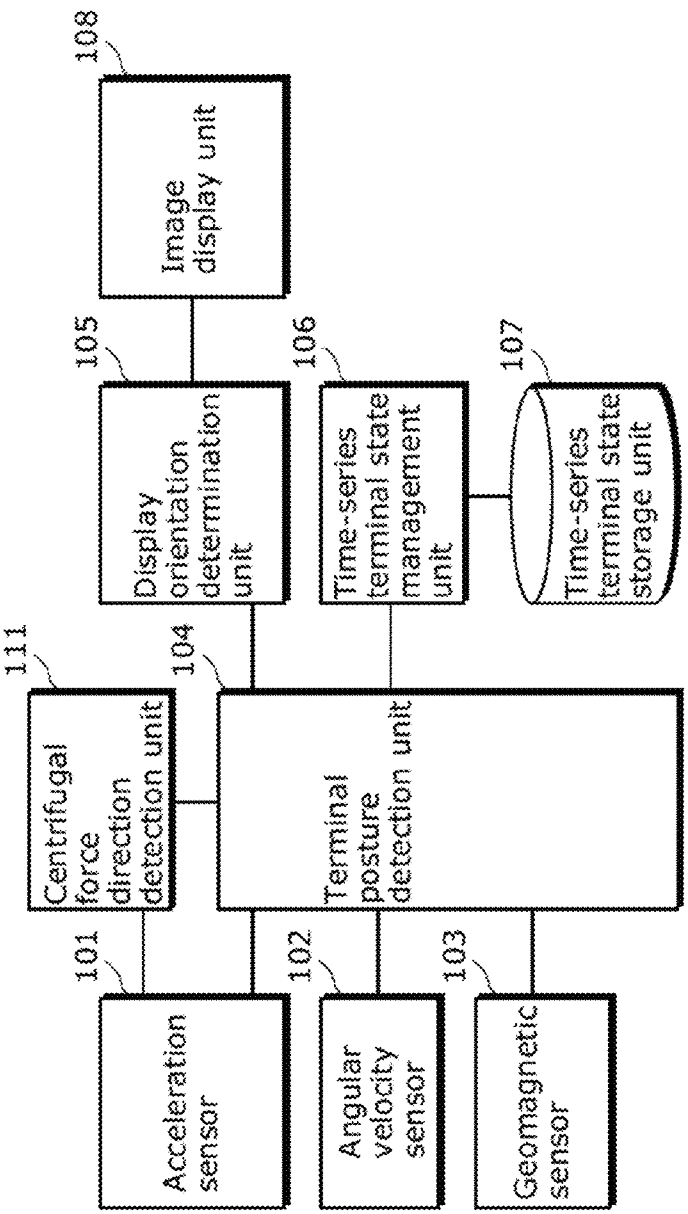

FIG. 508 is a diagram showing an internal structure of a processing unit that sets an orientation of an information display device according to Embodiment D2 of the present invention.

Figure 509:
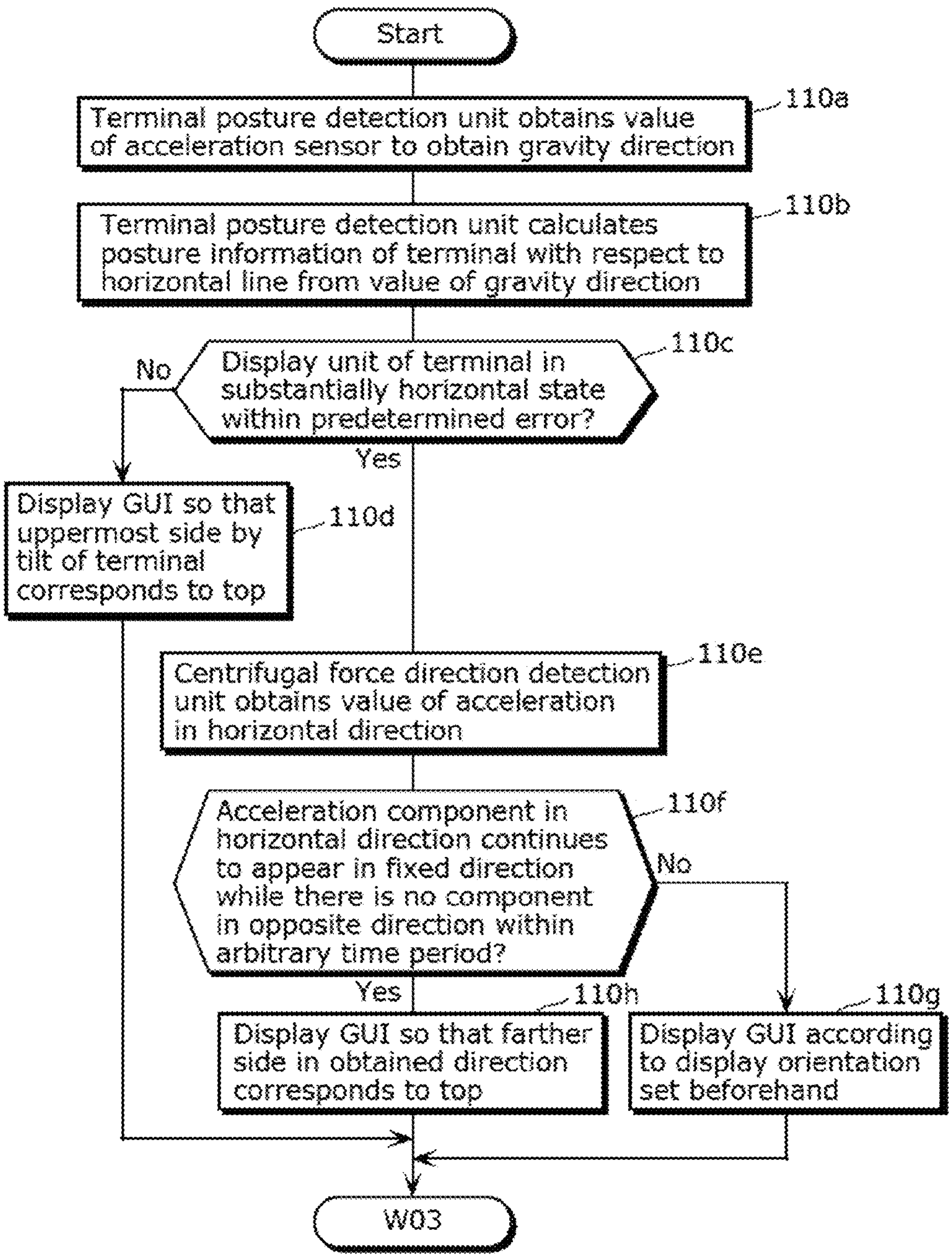

FIG. 509 is a diagram showing process flow of the information display device according to Embodiment D2 of the present invention.

Figure 510:
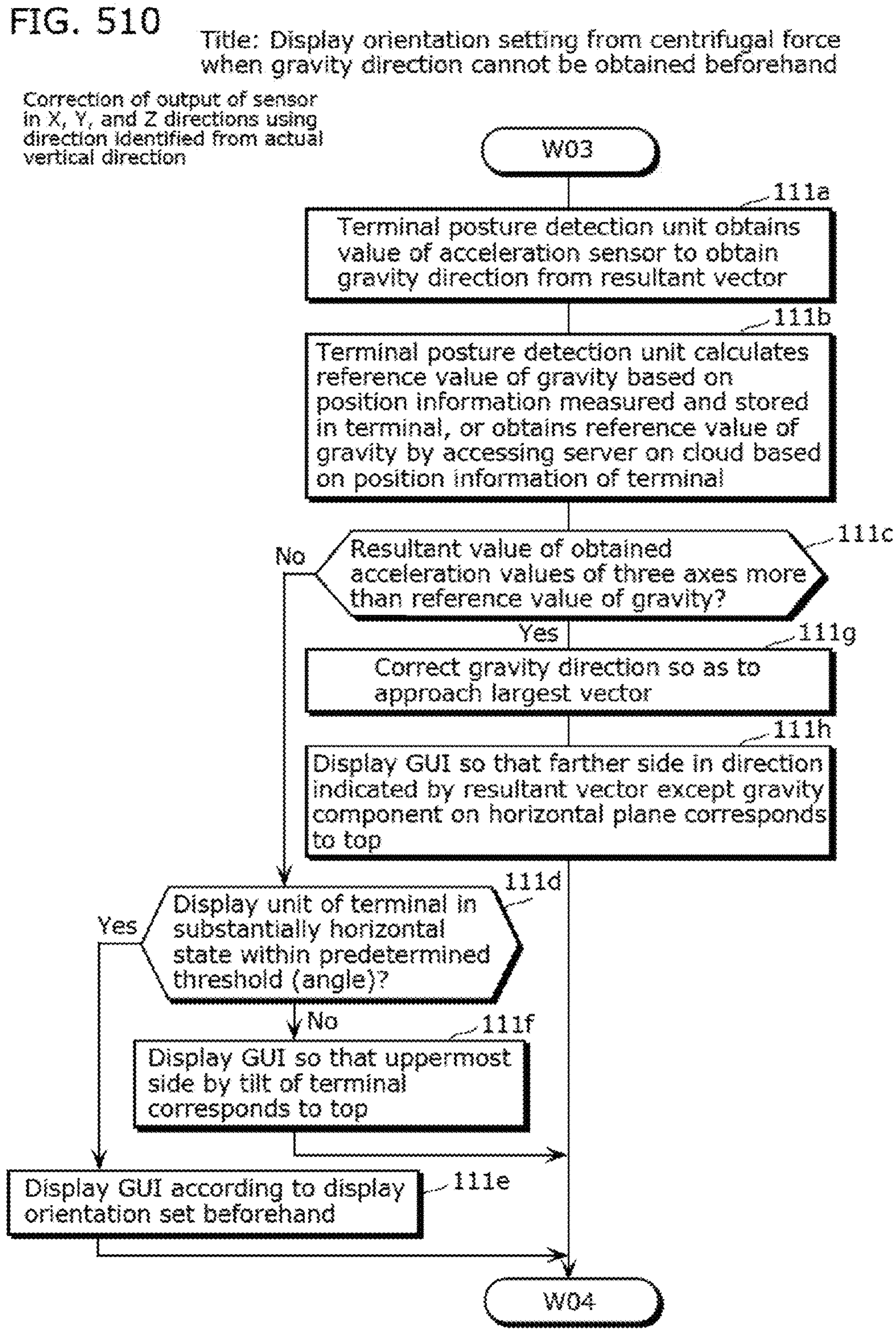

FIG. 510 is a diagram showing process flow of the information display device according to Embodiment D2 of the present invention.

Figure 511:
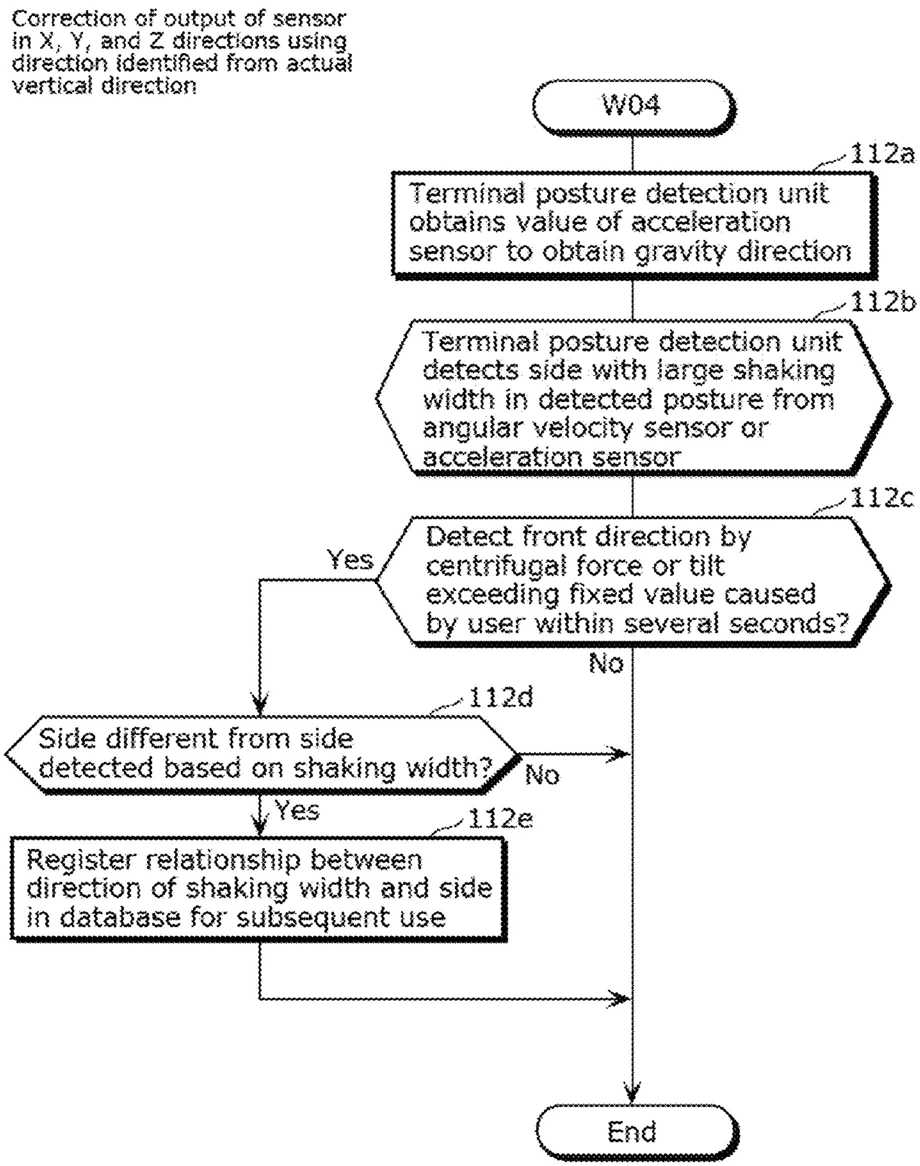

FIG. 511 is a diagram showing process flow of the information display device according to Embodiment D2 of the present invention.

Figure 512:
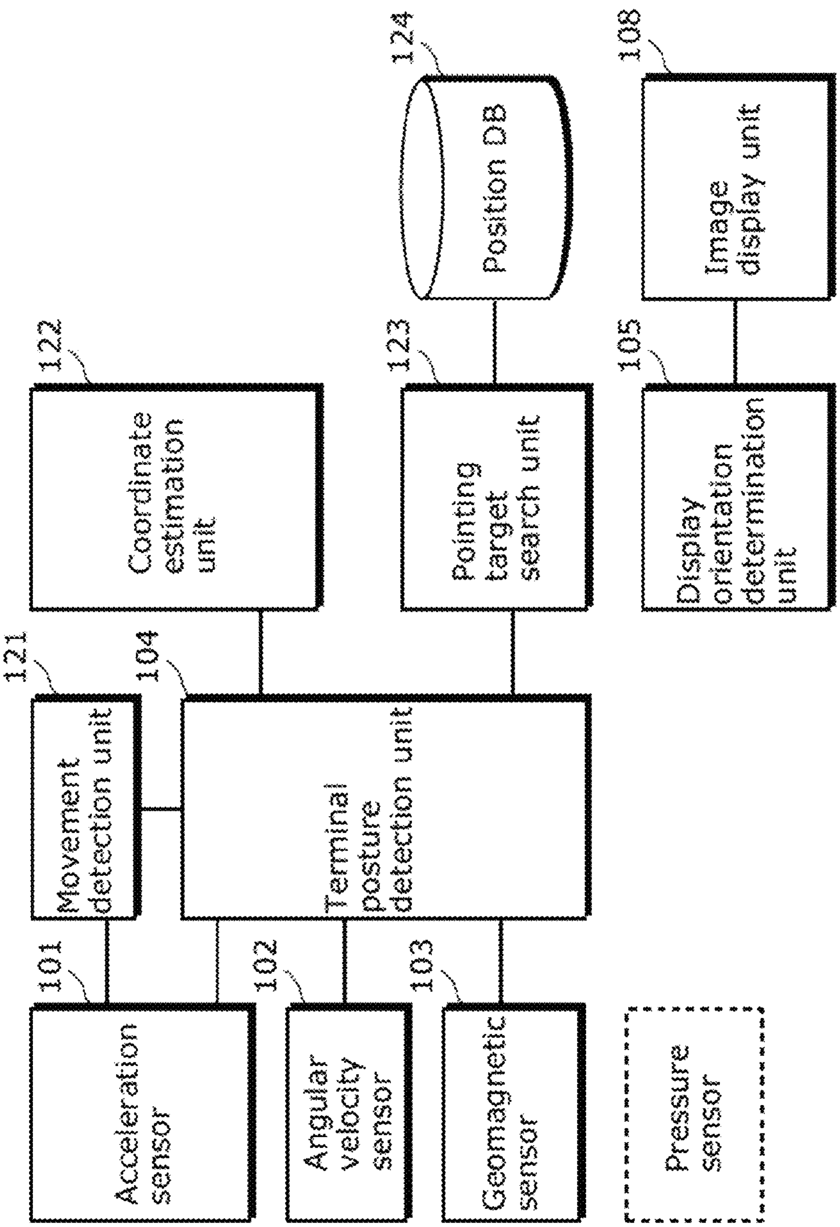

FIG. 512 is a diagram showing a structure of an information display device according to Embodiment D3 of the present invention.

Figure 513:
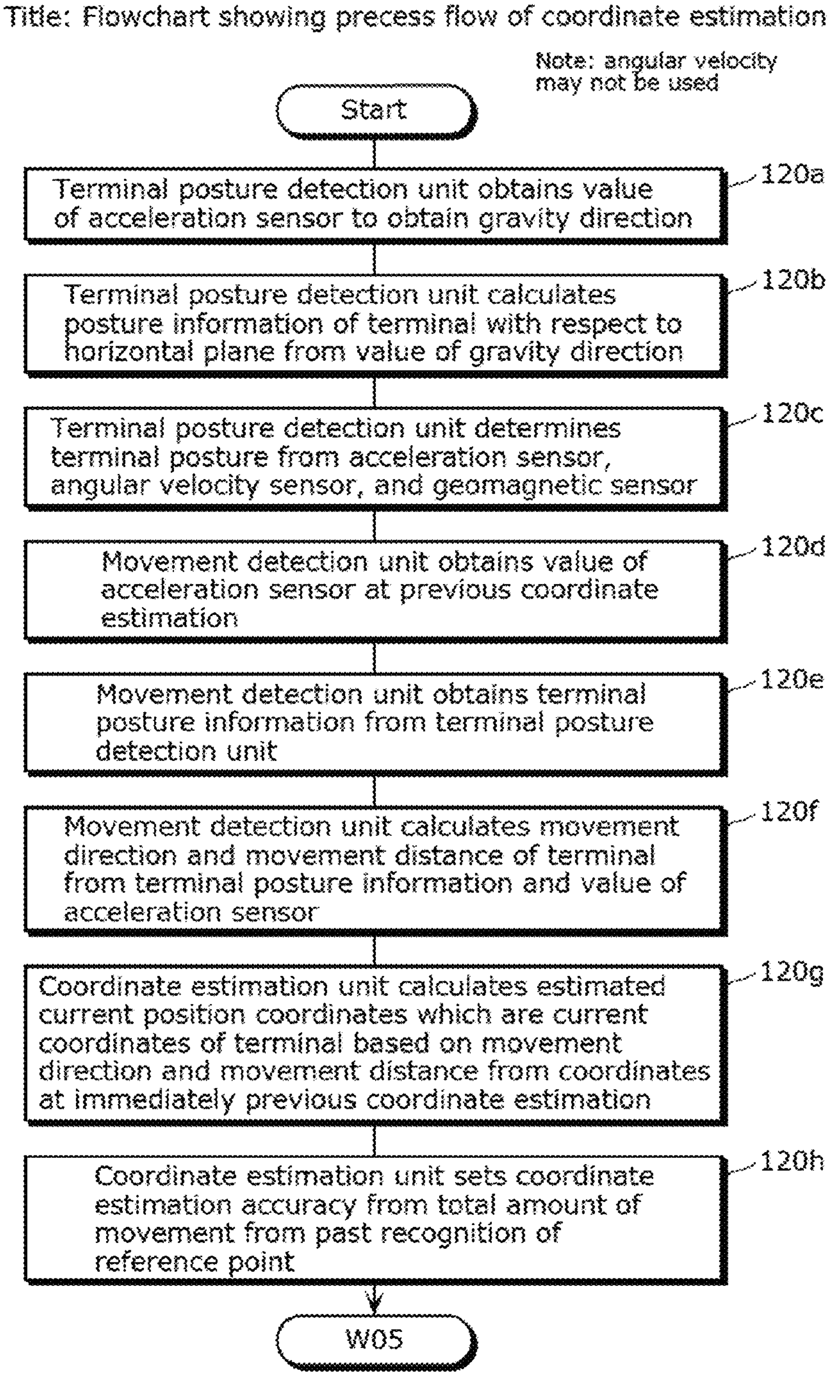

FIG. 513 is a diagram showing process flow of the information display device according to Embodiment D3 of the present invention.

Figure 514:
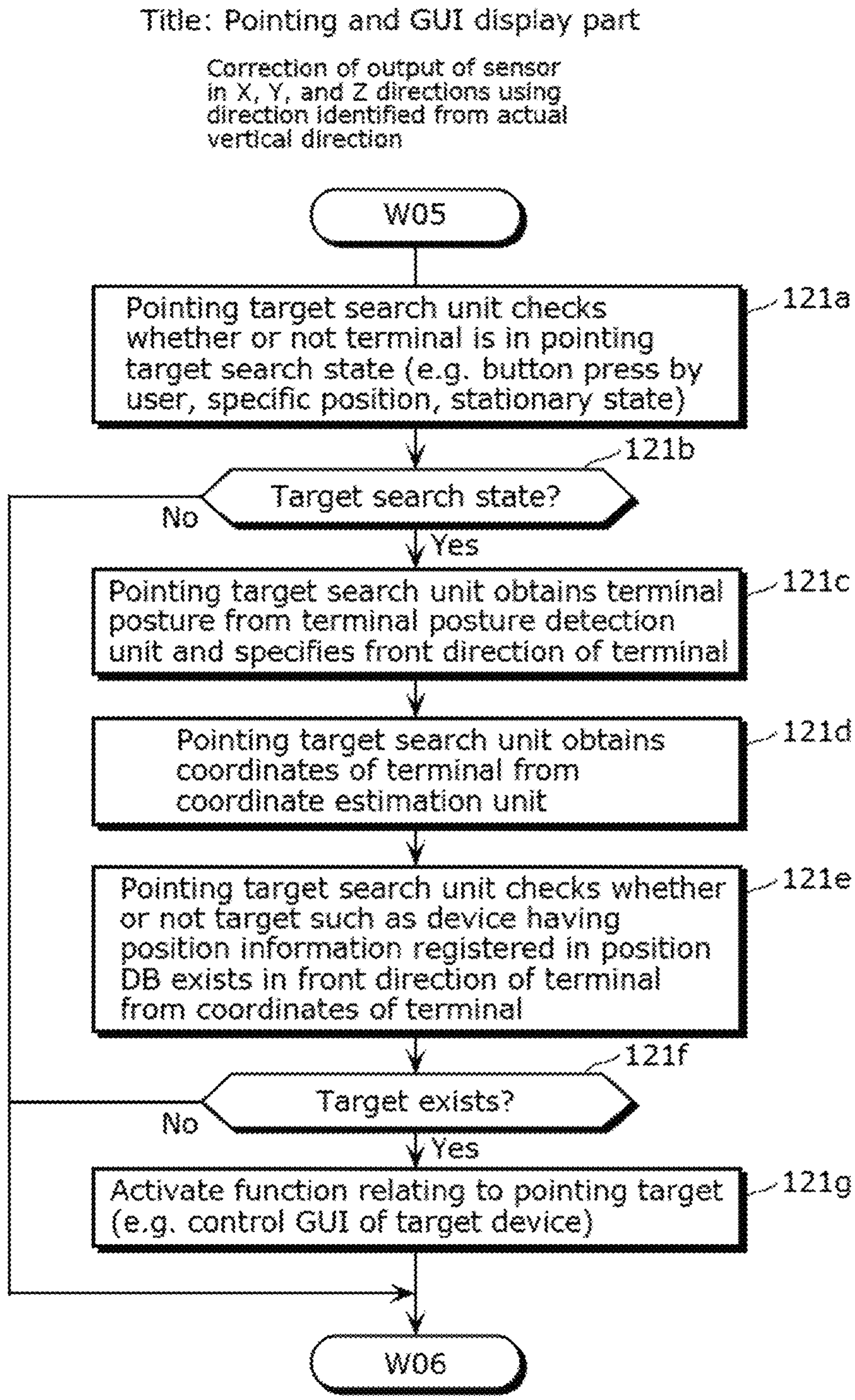

FIG. 514 is a diagram showing process flow of the information display device according to Embodiment D3 of the present invention.

Figure 515:
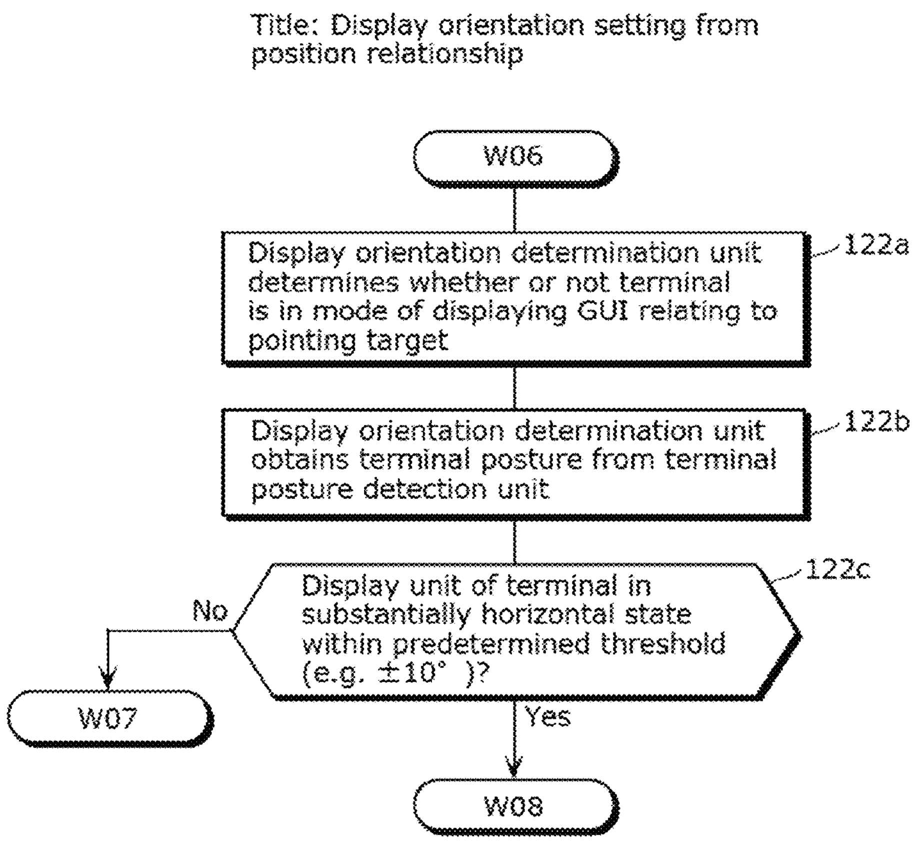

FIG. 515 is a diagram showing process flow of the information display device according to Embodiment D3 of the present invention.

Figure 516:
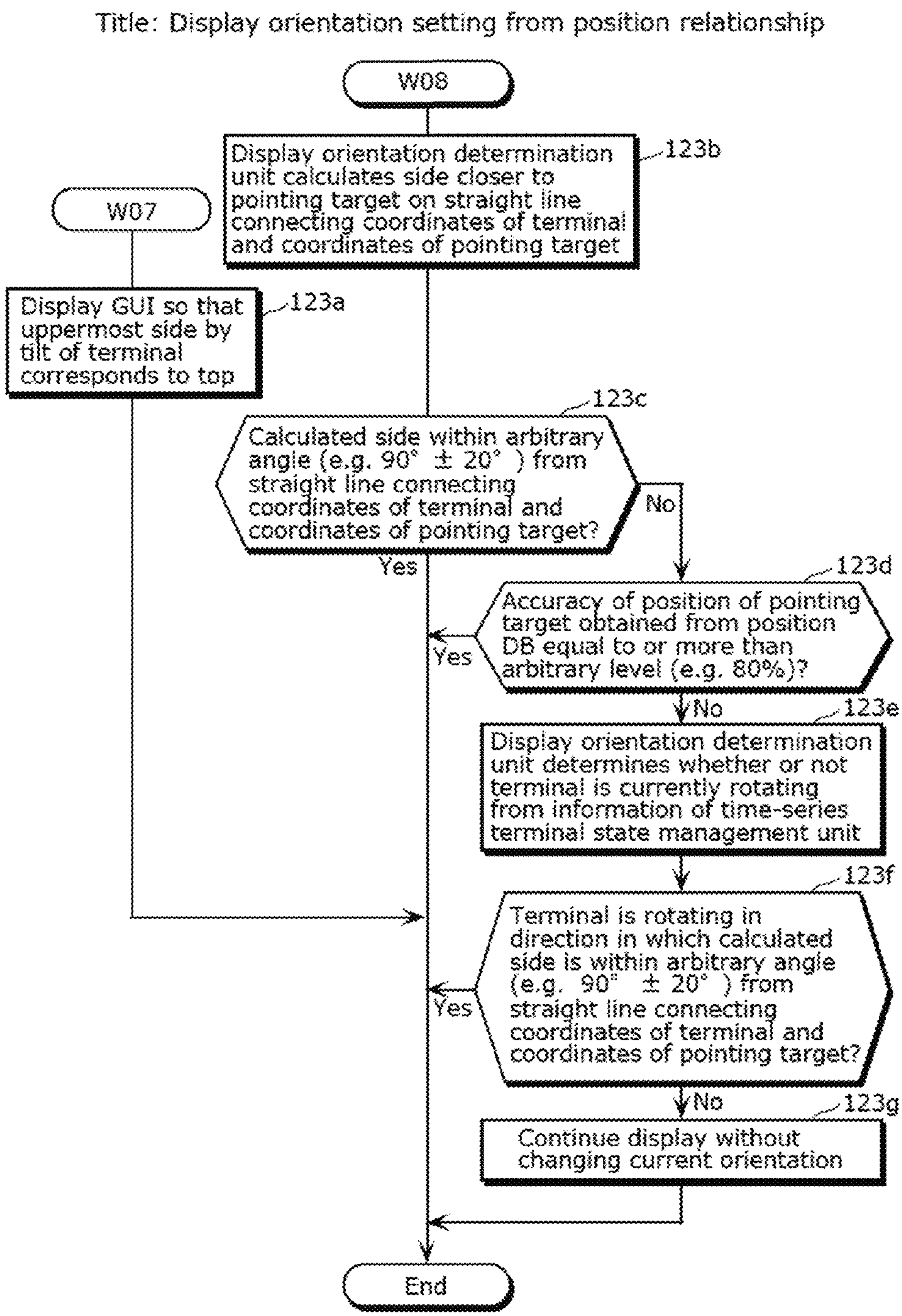

FIG. 516 is a diagram showing process flow of the information display device according to Embodiment D3 of the present invention.

FIG. 517 is a diagram showing an example of pointing target information stored in a position DB.

Figure 518:
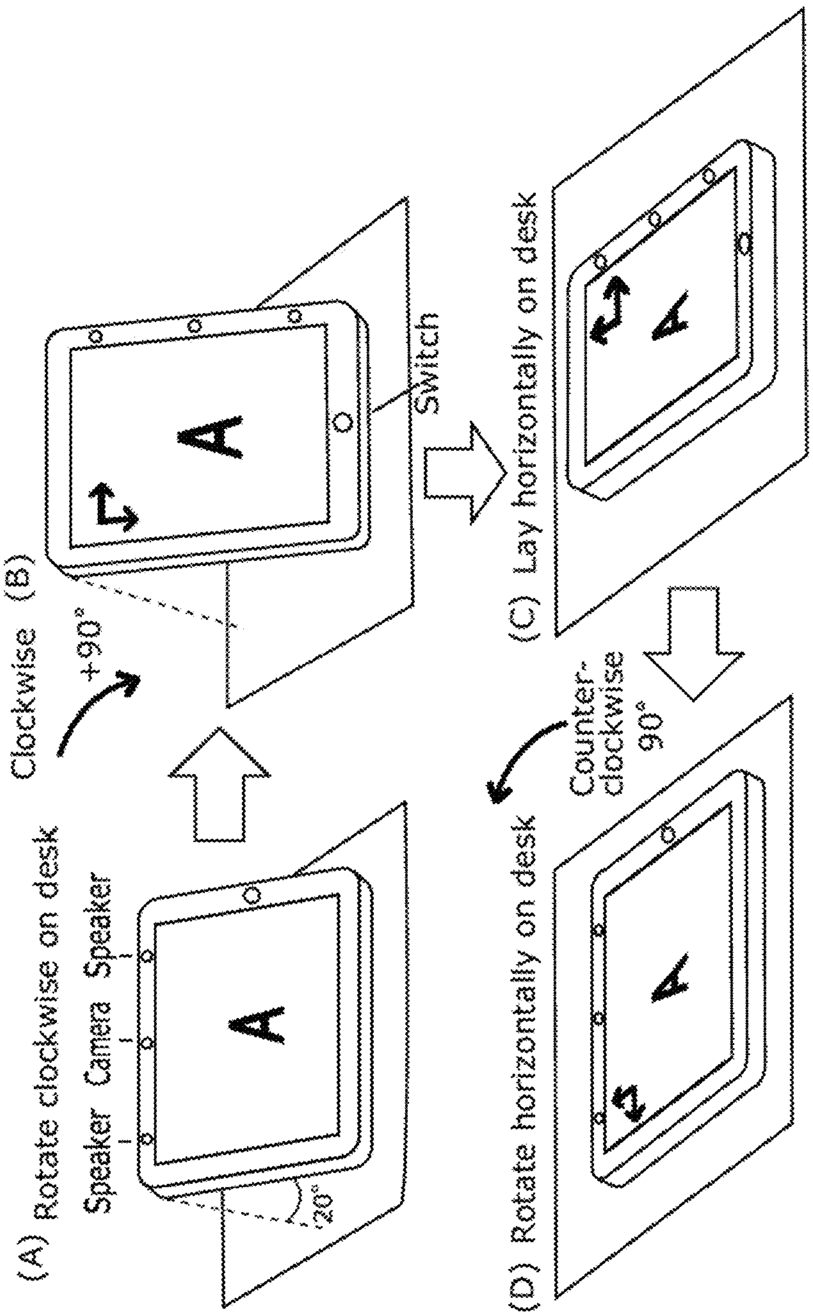

FIG. 518 is a diagram showing another example of the relationship between the posture and the screen display orientation of the information display device according to the present invention.

Figure 519:
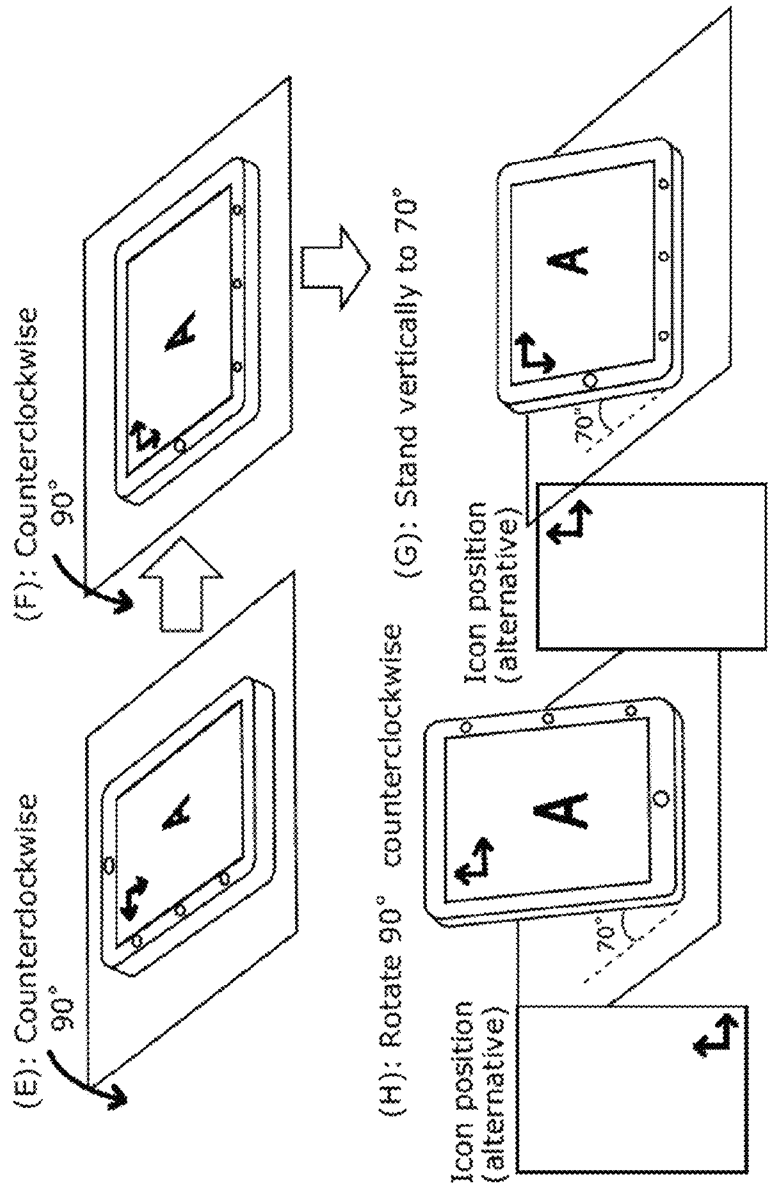

FIG. 519 is a diagram showing another example of the relationship between the posture and the screen display orientation of the information display device according to the present invention.

Figure 520:
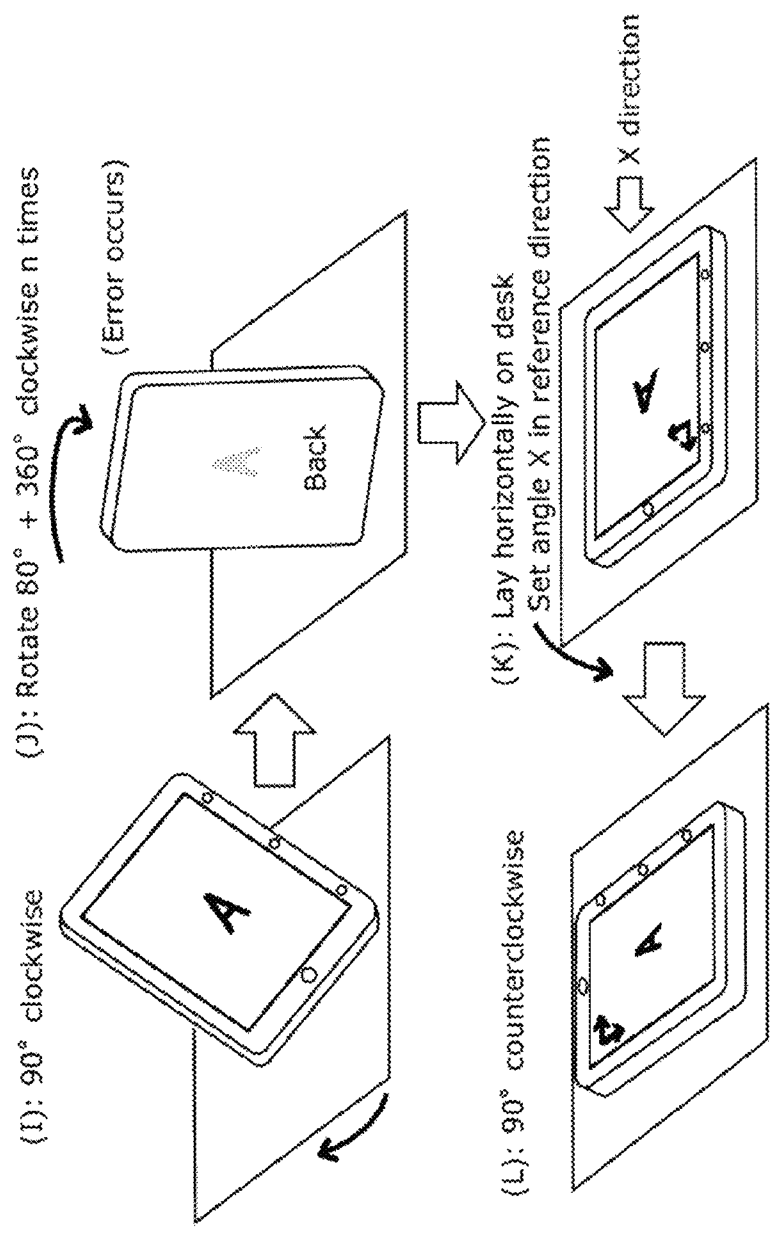

FIG. 520 is a diagram showing another example of the relationship between the posture and the screen display orientation of the information display device according to the present invention.

Figure 521:
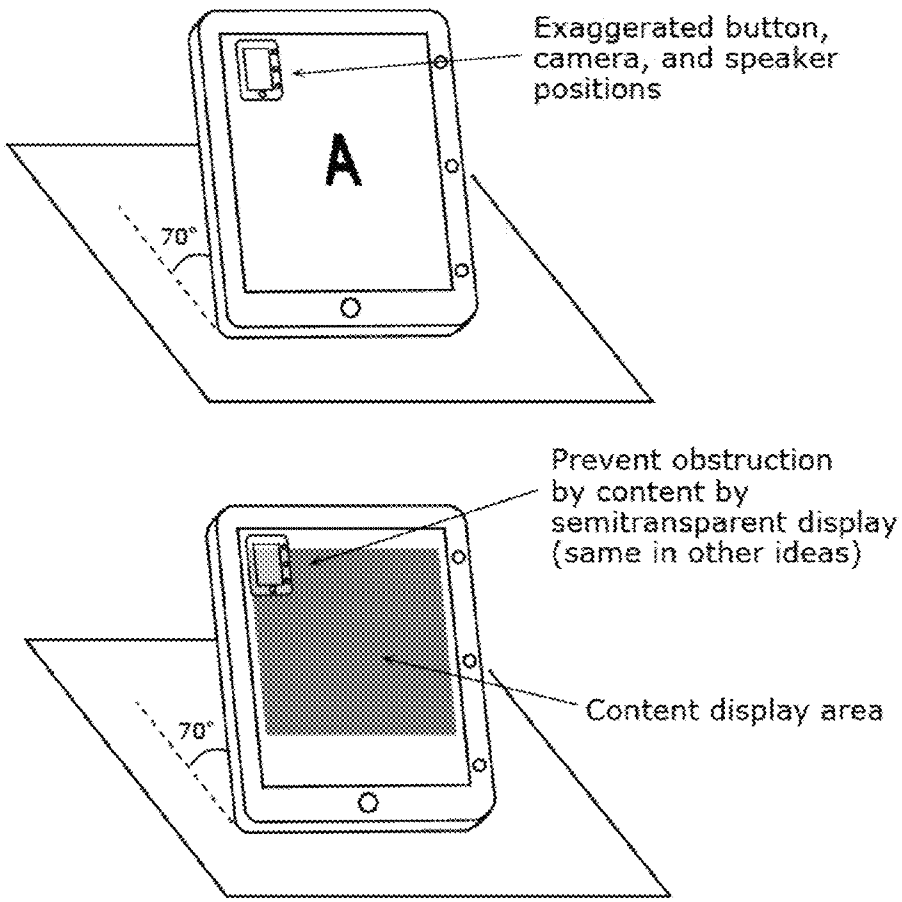

FIG. 521 is a diagram showing a method of displaying an icon indicating an orientation of an information display device itself according to Embodiment D4 of the present invention.

FIG. 522 is a diagram showing icon variations indicating a normal position in the information display device (mobile device) according to Embodiment D4 of the present invention.

Figure 523:
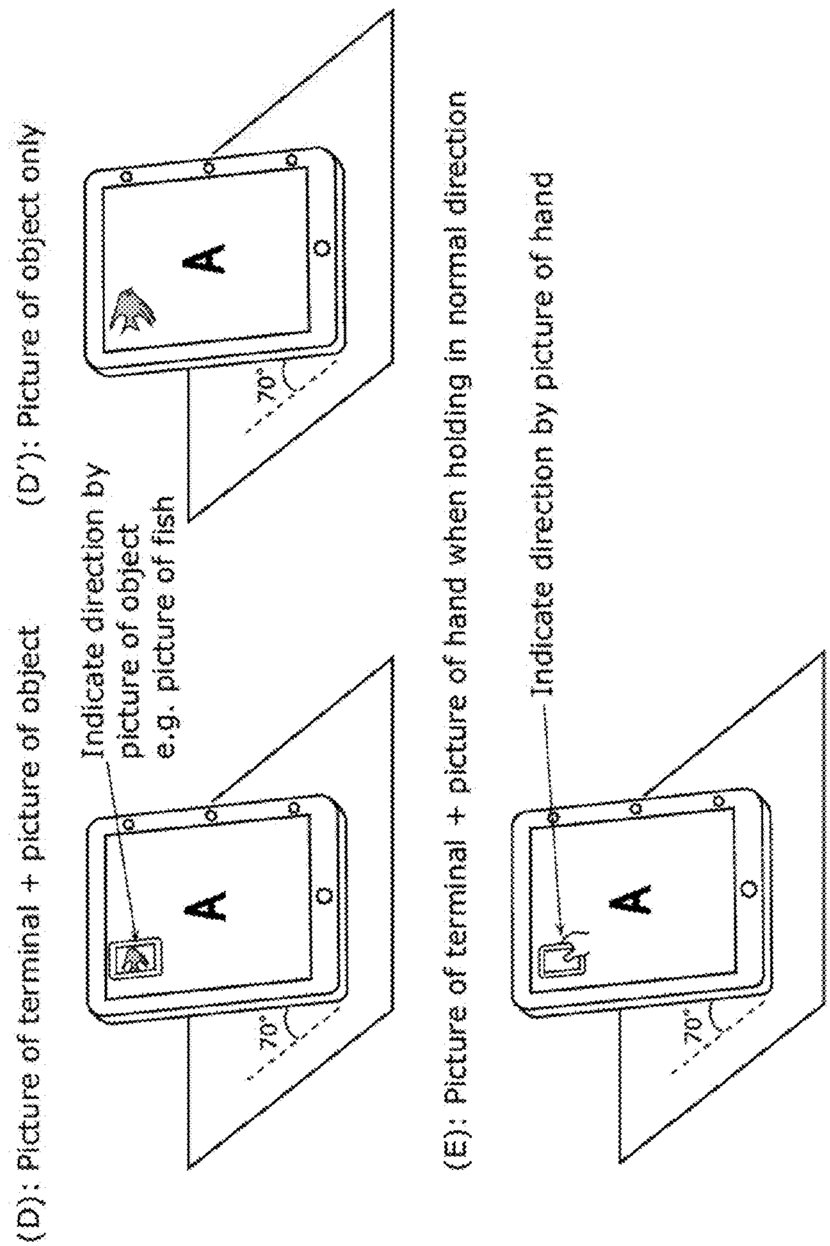

FIG. 523 is a diagram showing icon variations indicating the normal position in the information display device (mobile device) according to Embodiment D4 of the present invention.

FIG. 524 is a diagram showing icon variations indicating the normal position in the information display device (mobile device) according to Embodiment D4 of the present invention.

FIG. 525 is a diagram showing icon variations indicating the normal position in the information display device (mobile device) according to Embodiment D4 of the present invention.

FIG. 526 is a diagram showing icon variations indicating the normal position in the information display device (mobile device) according to Embodiment D4 of the present invention.

FIG. 527 is a diagram showing icon variations indicating the normal position in the information display device (mobile device) according to Embodiment D4 of the present invention.

Figure 528:
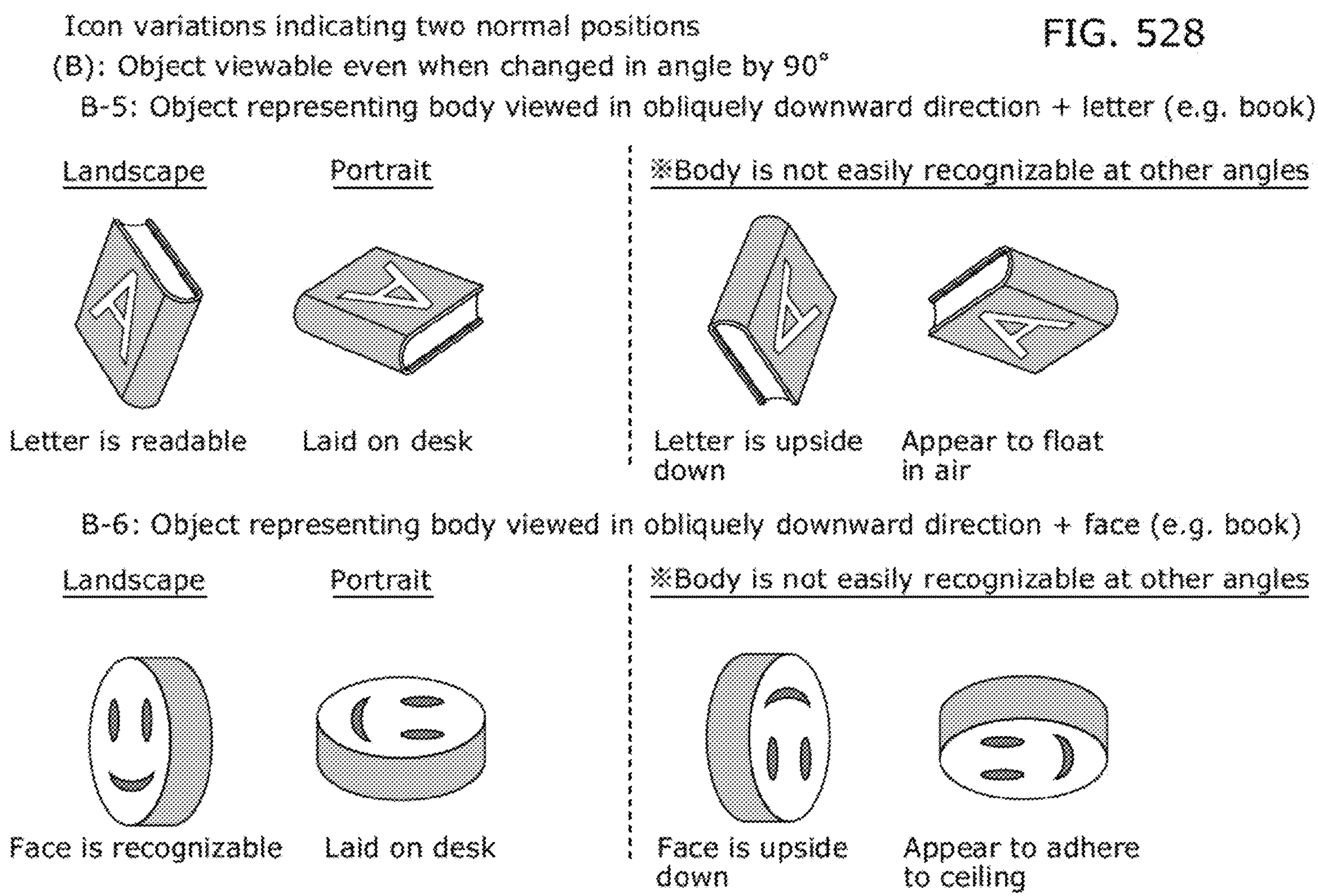

FIG. 528 is a diagram showing icon variations indicating the normal position in the information display device (mobile device) according to Embodiment D4 of the present invention.

FIG. 529 is a diagram showing icon variations indicating the normal position in the information display device (mobile device) according to Embodiment D4 of the present invention.

Figure 530:
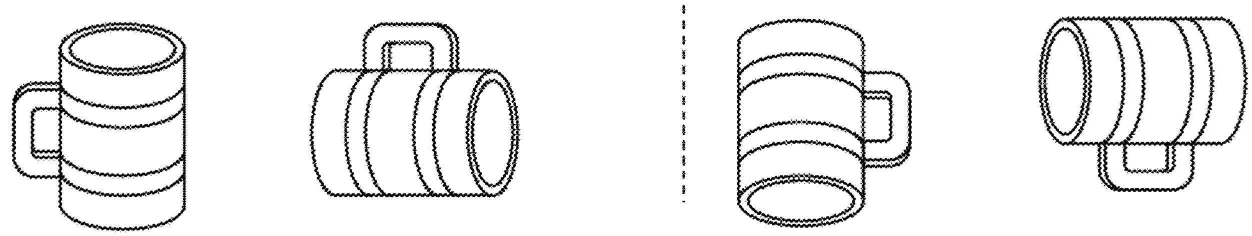

FIG. 530 is a diagram showing icon variations indicating the normal position in the information display device (mobile device) according to Embodiment D4 of the present invention.

Figure 531:
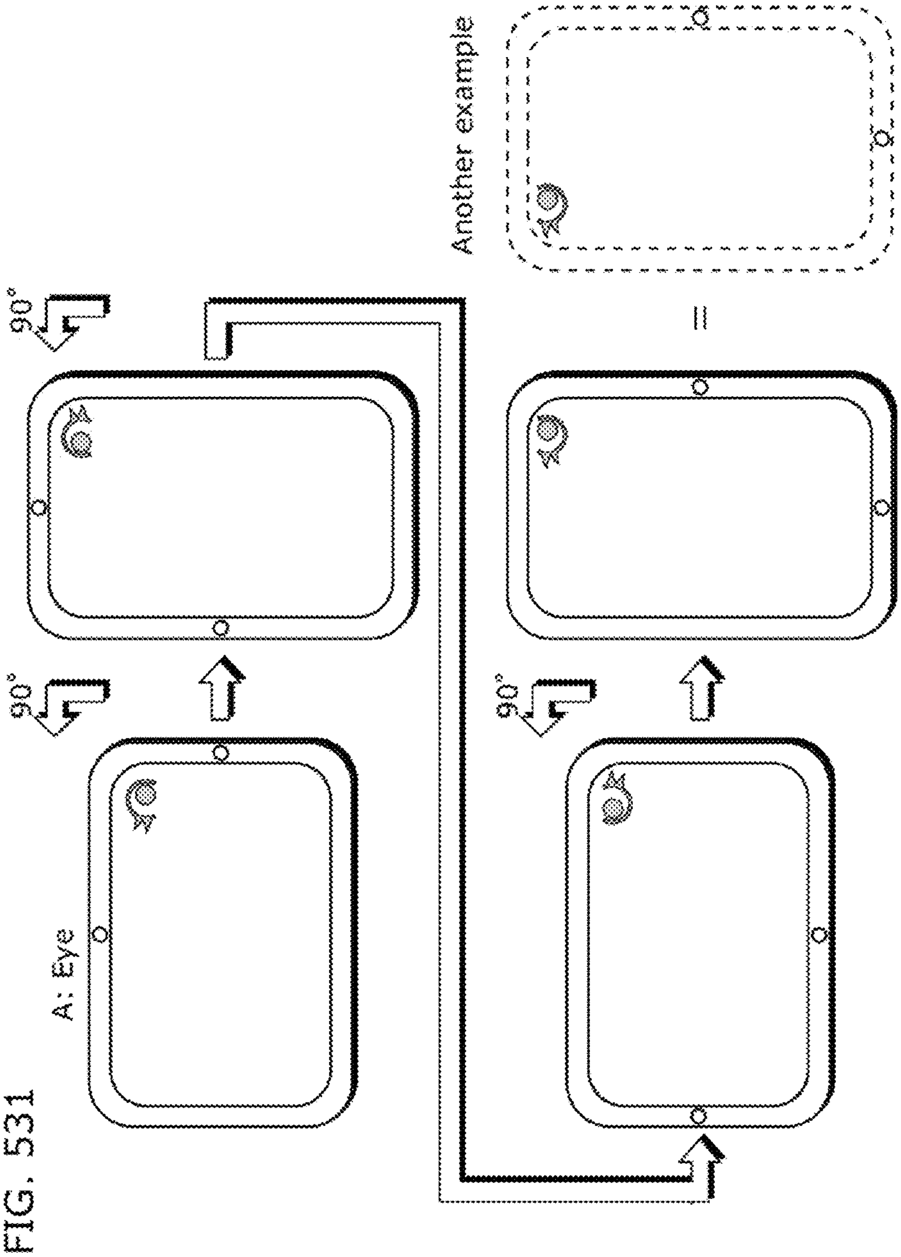

FIG. 531 is a diagram showing an icon for calling the user's attention to the normal position in the information display device according to Embodiment D4 of the present invention.

Figure 532:
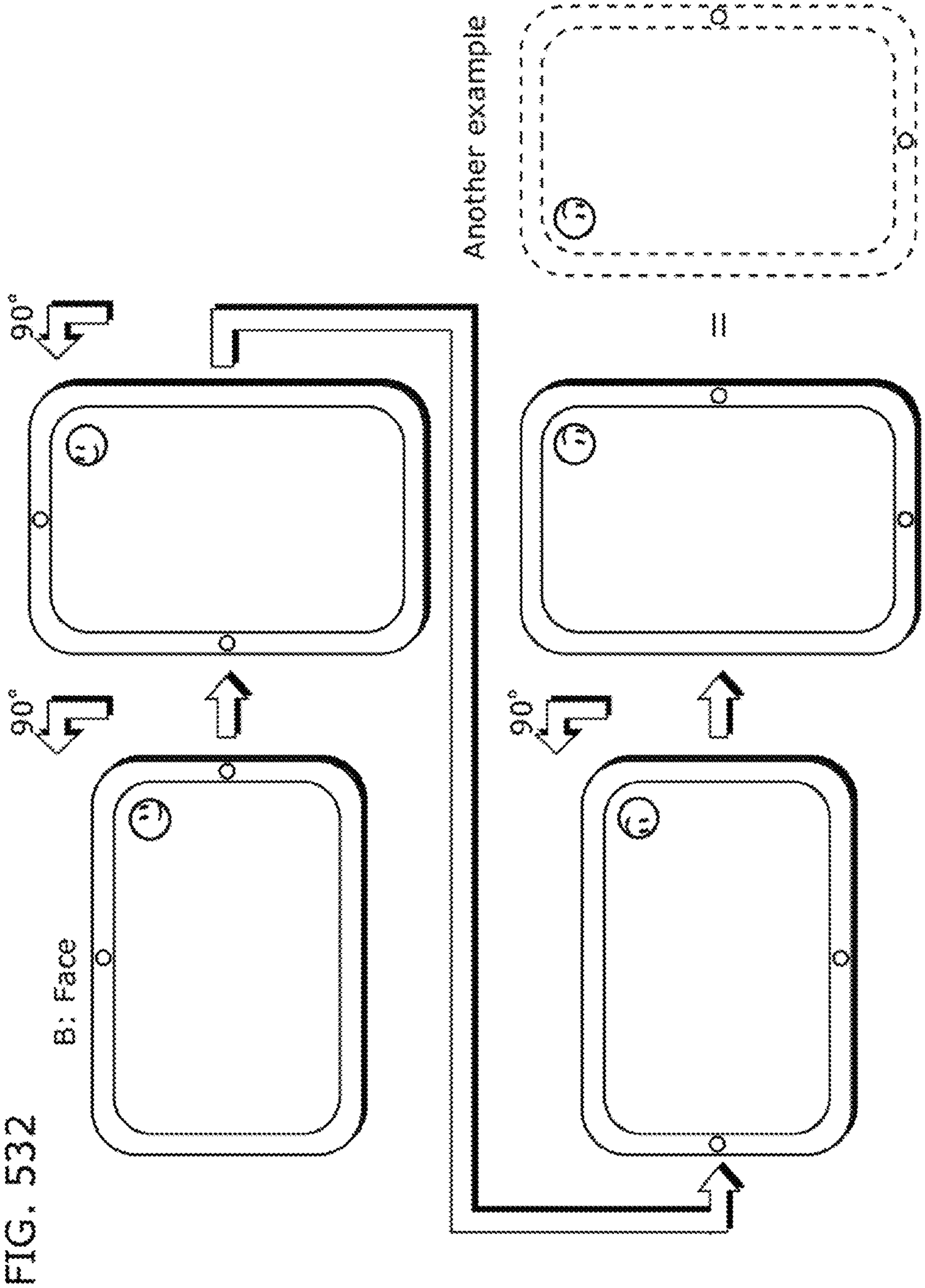

FIG. 532 is a diagram showing an icon for calling the user's attention to the normal position in the information display device according to Embodiment D4 of the present invention.

Figure 533:
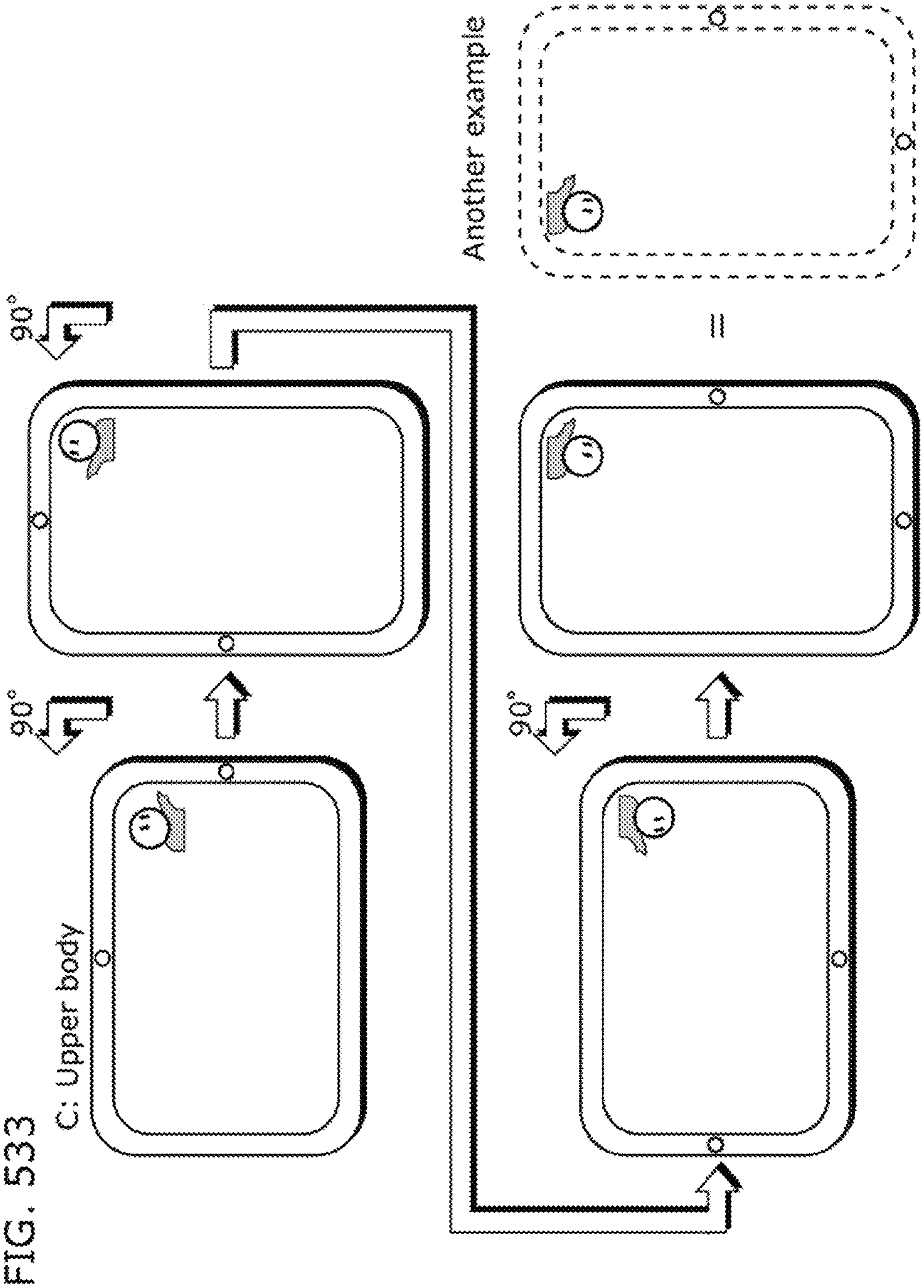

FIG. 533 is a diagram showing an icon for calling the user's attention to the normal position in the information display device according to Embodiment D4 of the present invention.

Figure 534:
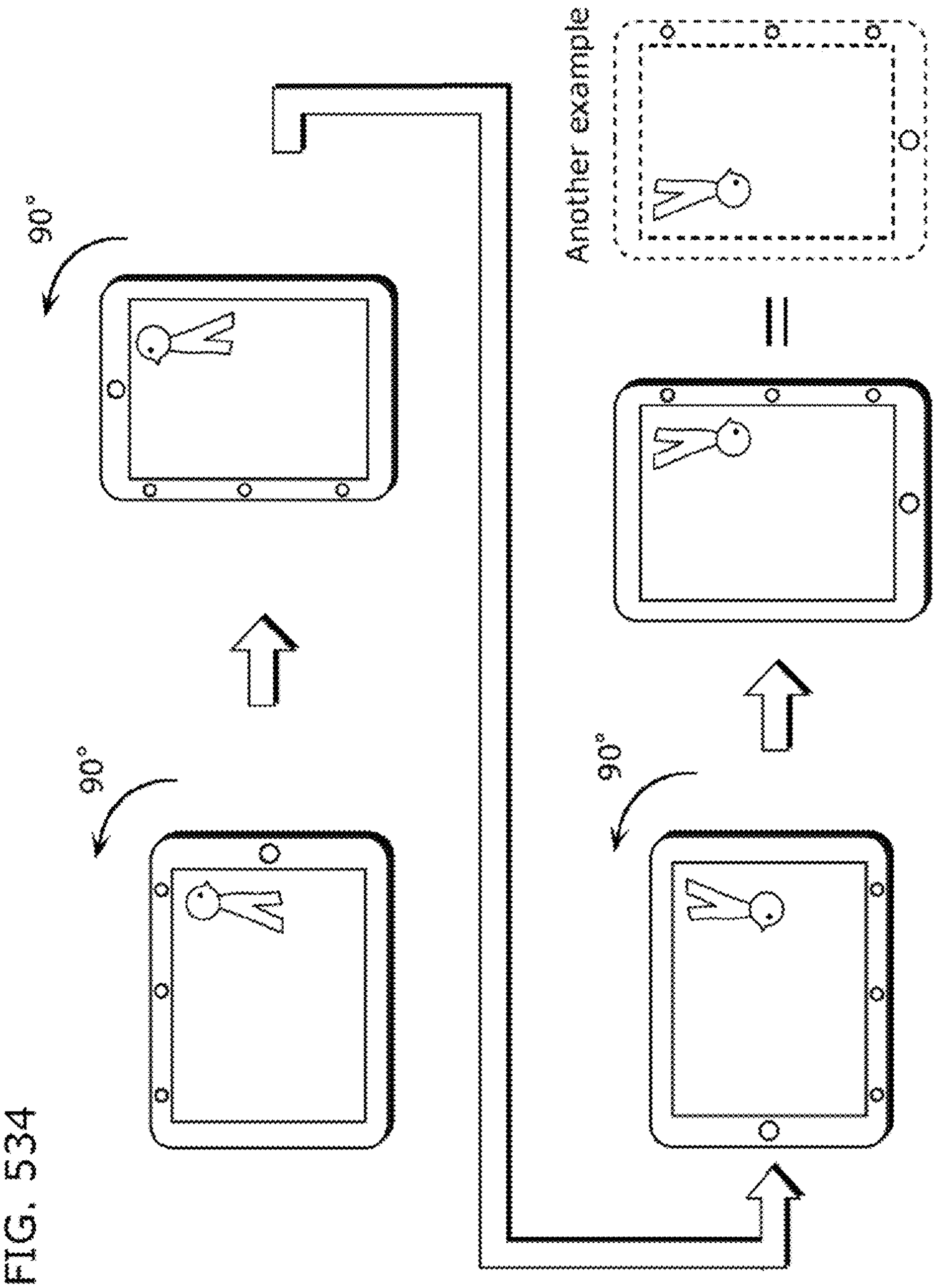

FIG. 534 is a diagram showing an icon for calling the user's attention to the normal position in the information display device according to Embodiment D4 of the present invention.

Figure 535:
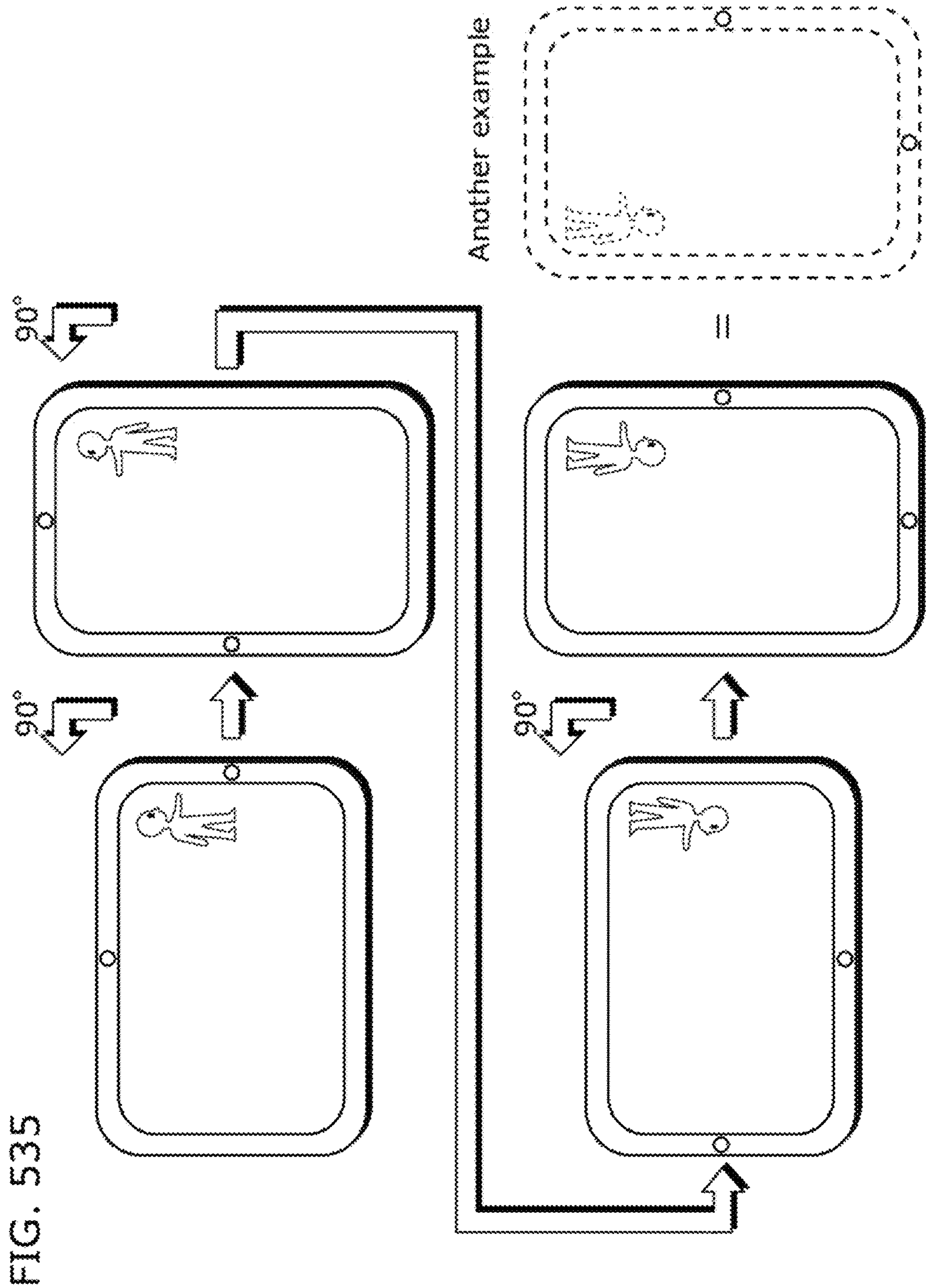

FIG. 535 is a diagram showing an icon for calling the user's attention to the normal position in the information display device according to Embodiment D4 of the present invention.

Figure 536:
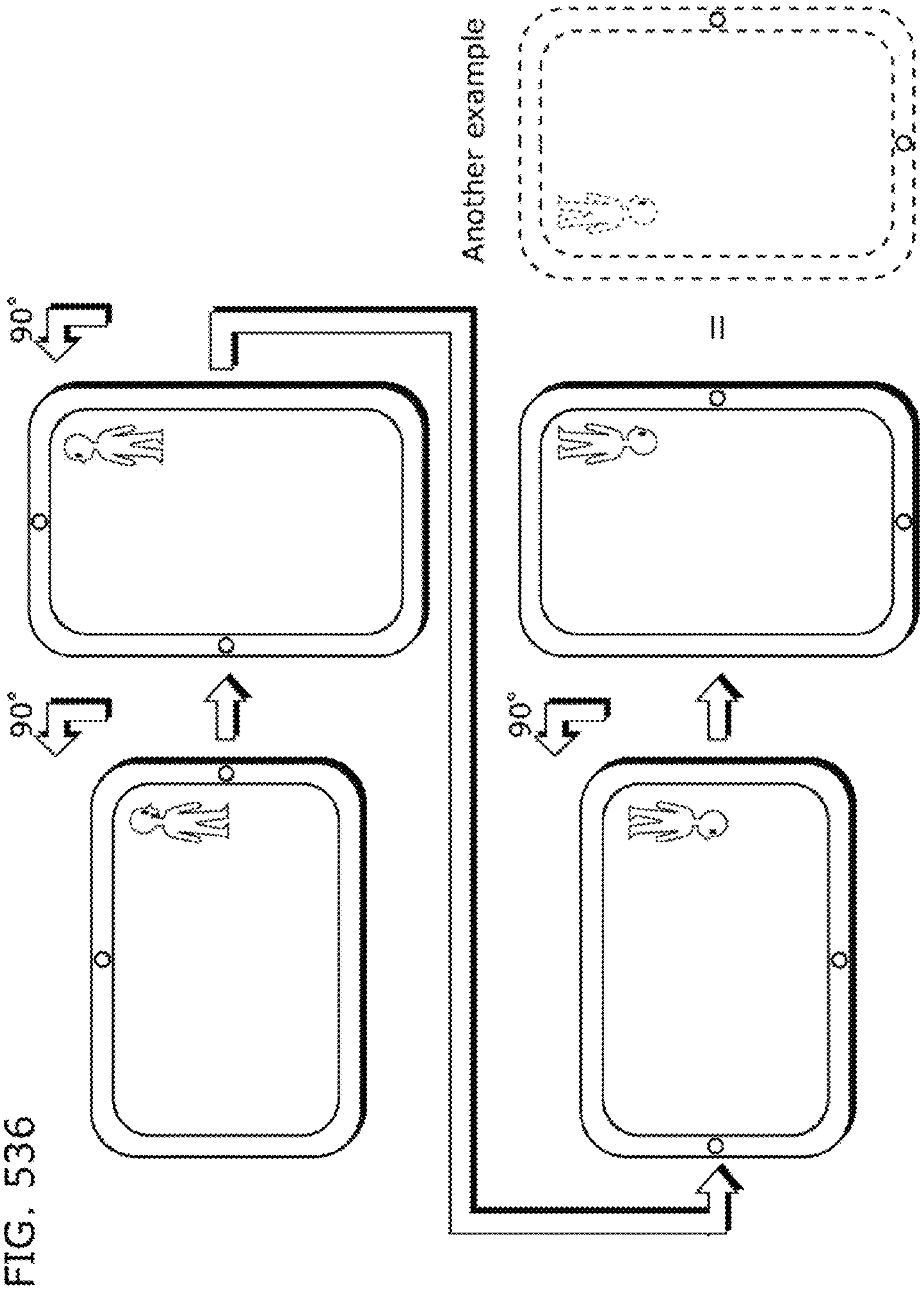

FIG. 536 is a diagram showing an icon for calling the user's attention to the normal position in the information display device according to Embodiment D4 of the present invention.

Figure 537:
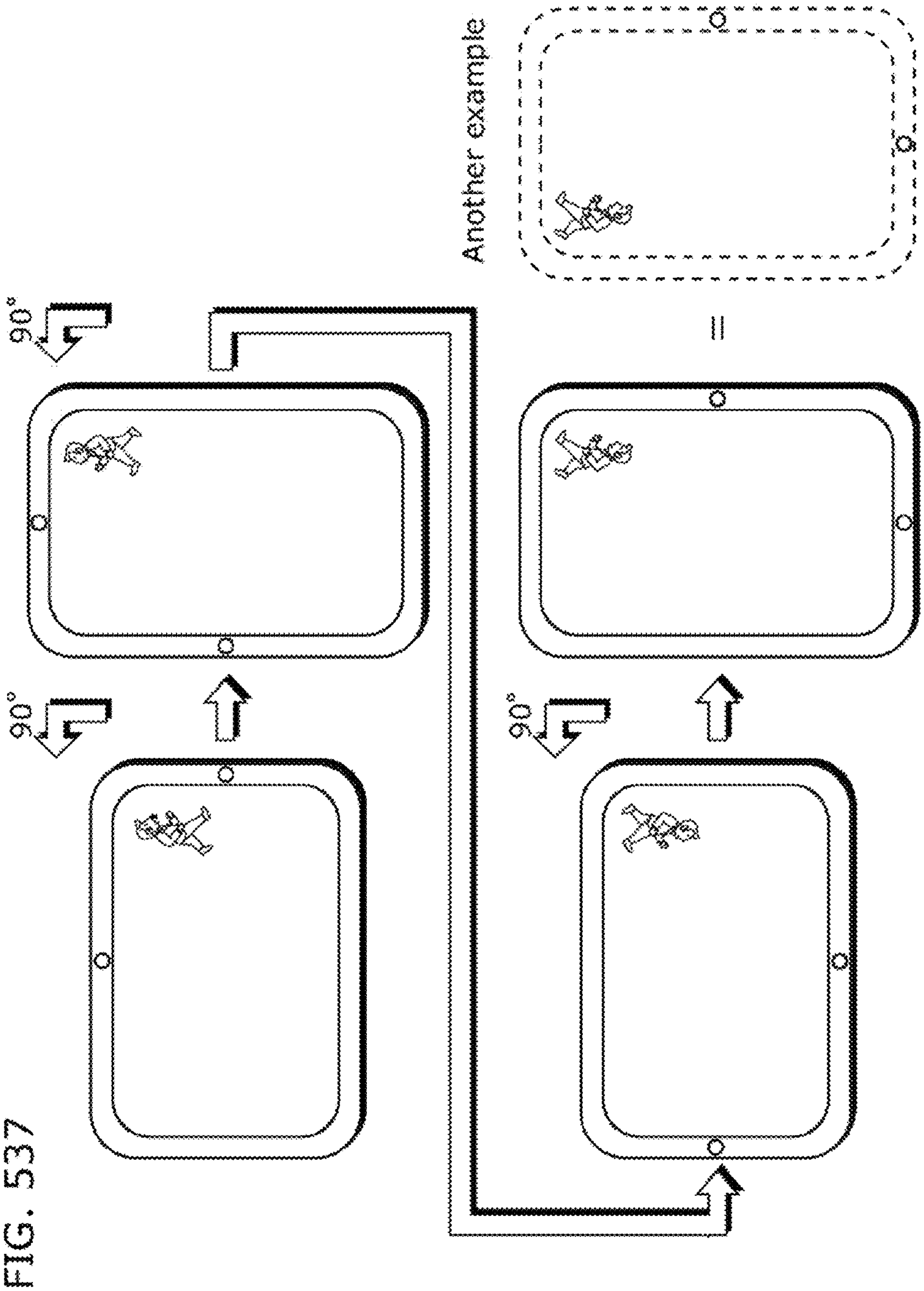

FIG. 537 is a diagram showing an icon for calling the user's attention to the normal position in the information display device according to Embodiment D4 of the present invention.

Figure 538:
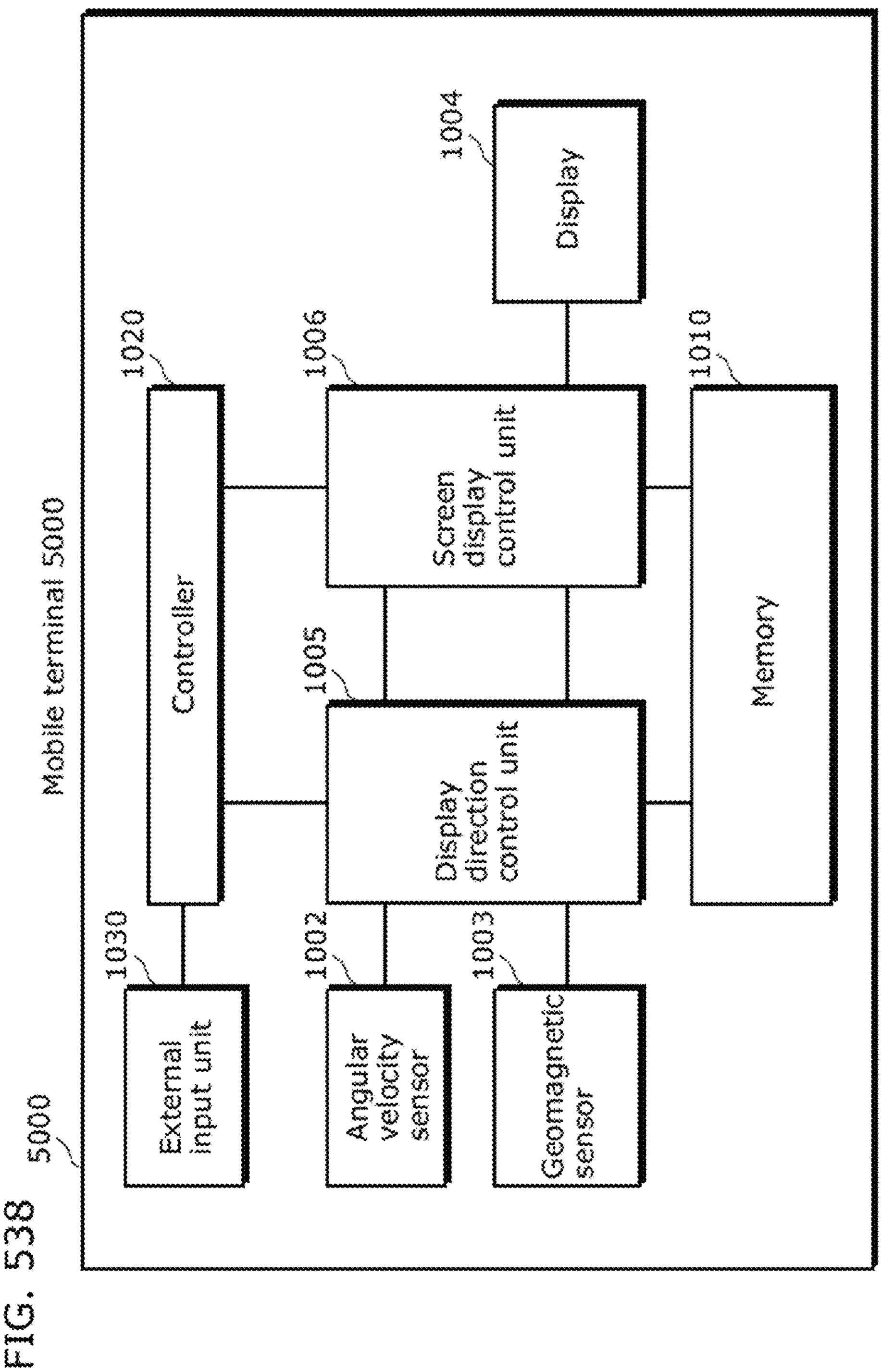

FIG. 538 is a diagram showing a structure of a mobile terminal which is one aspect of an information display device according to Embodiment D5 of the present invention.

Figure 539:
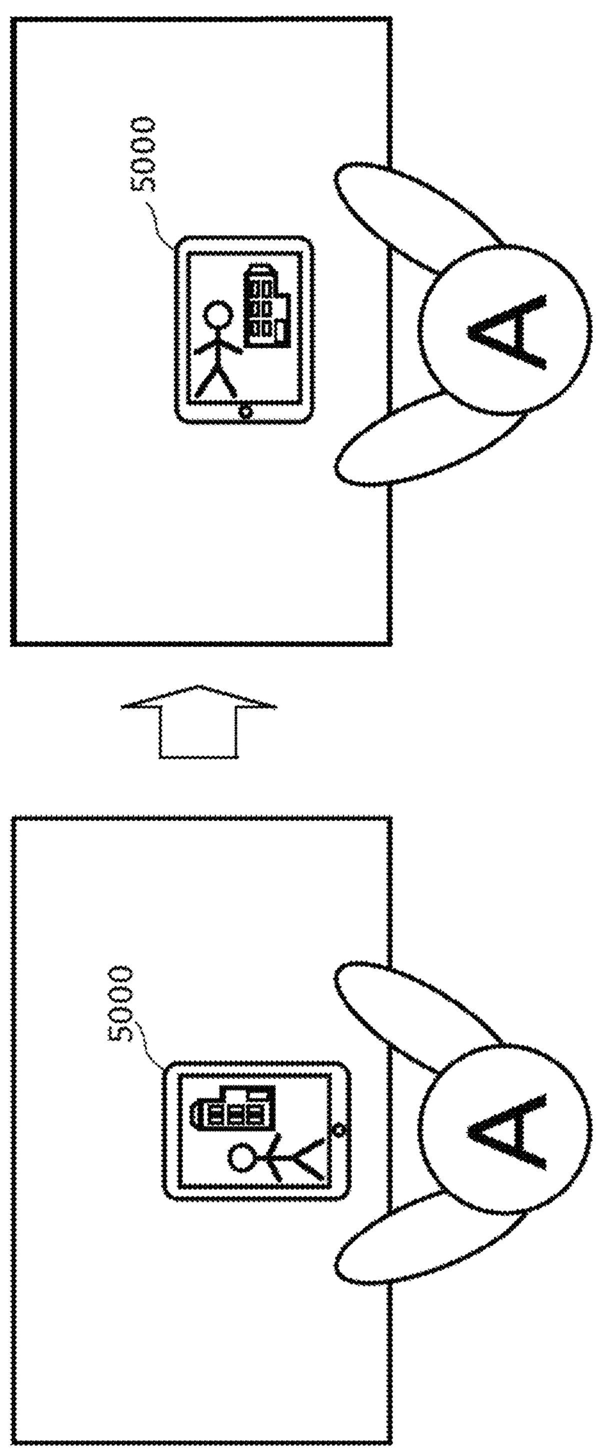

FIG. 539 is a diagram showing a use case example according to Embodiment D5 of the present invention.

Figure 540:
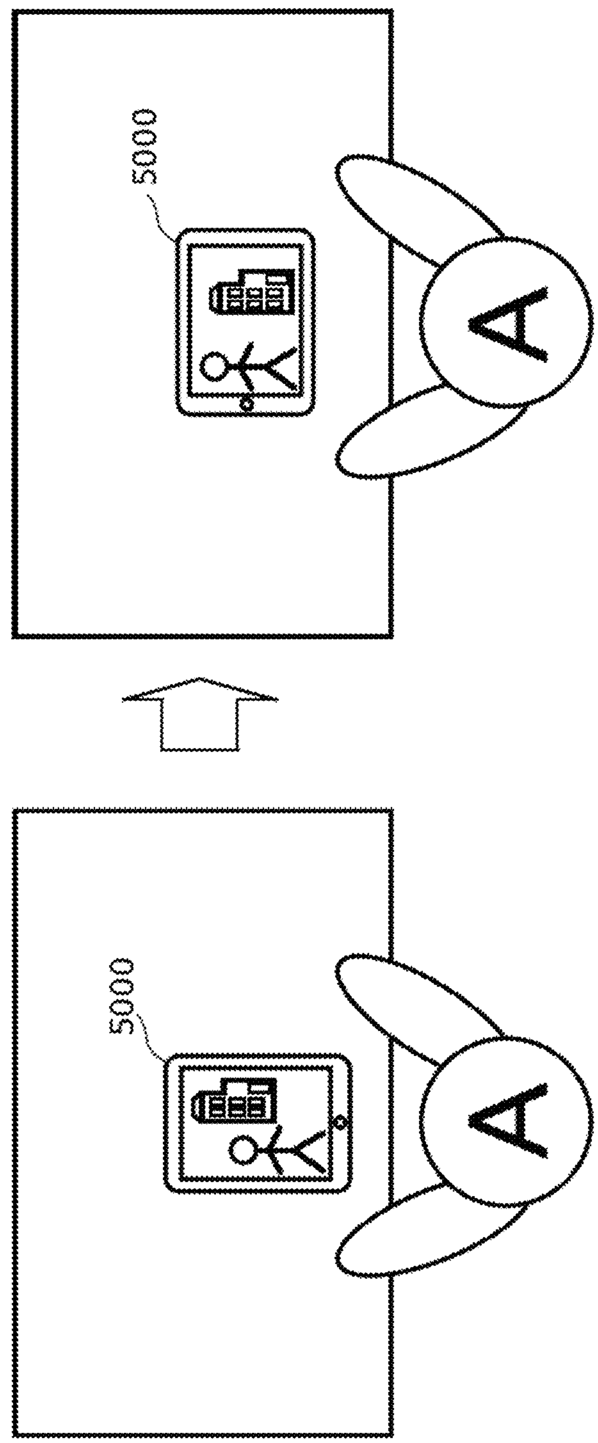

FIG. 540 is a diagram showing a use case example according to Embodiment D5 of the present invention.

Figure 541:
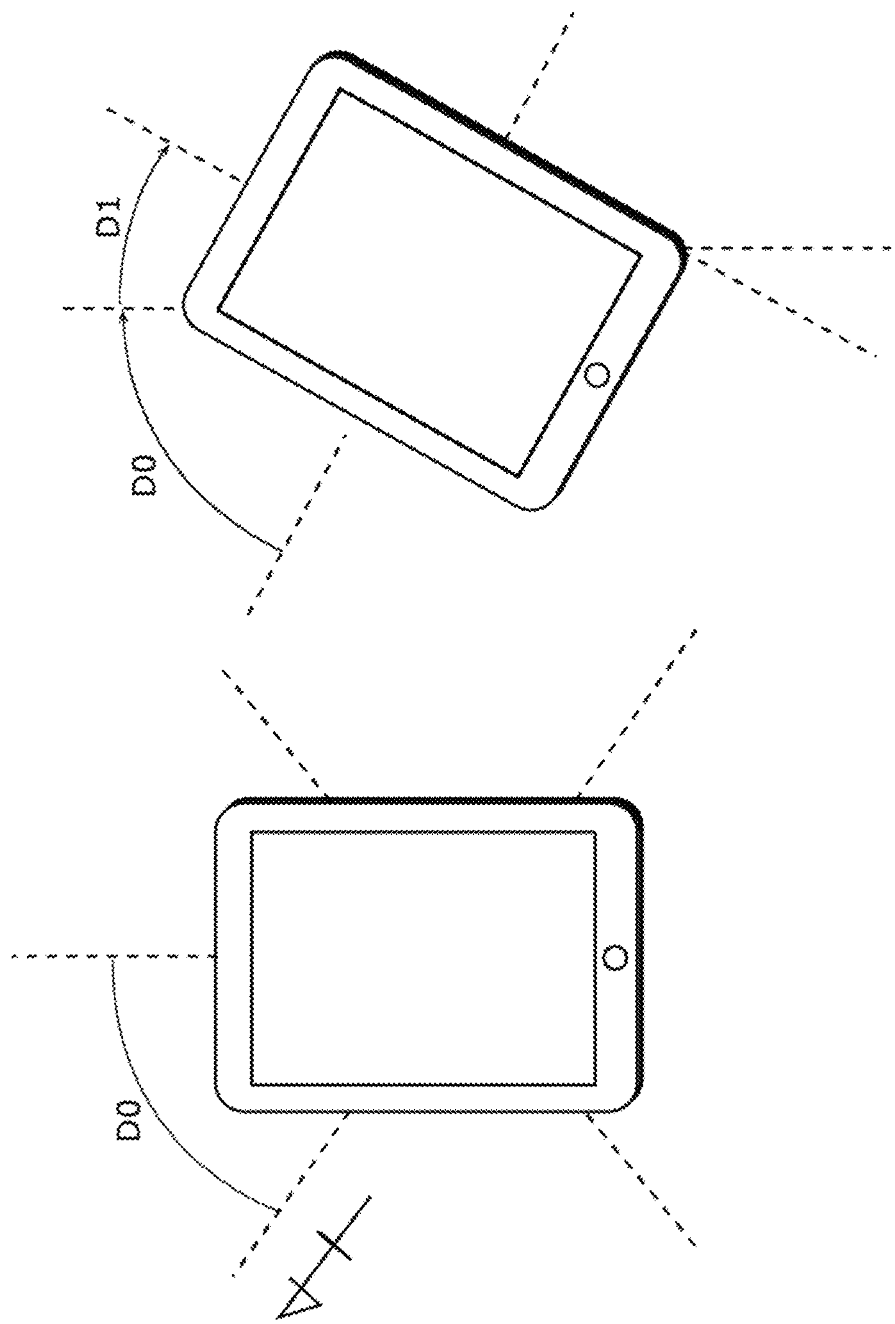

FIG. 541 is a diagram showing definitions of variables relating to horizontal and vertical postures of a mobile terminal, which are used in description of Embodiment D5 of the present invention.

Figure 542:
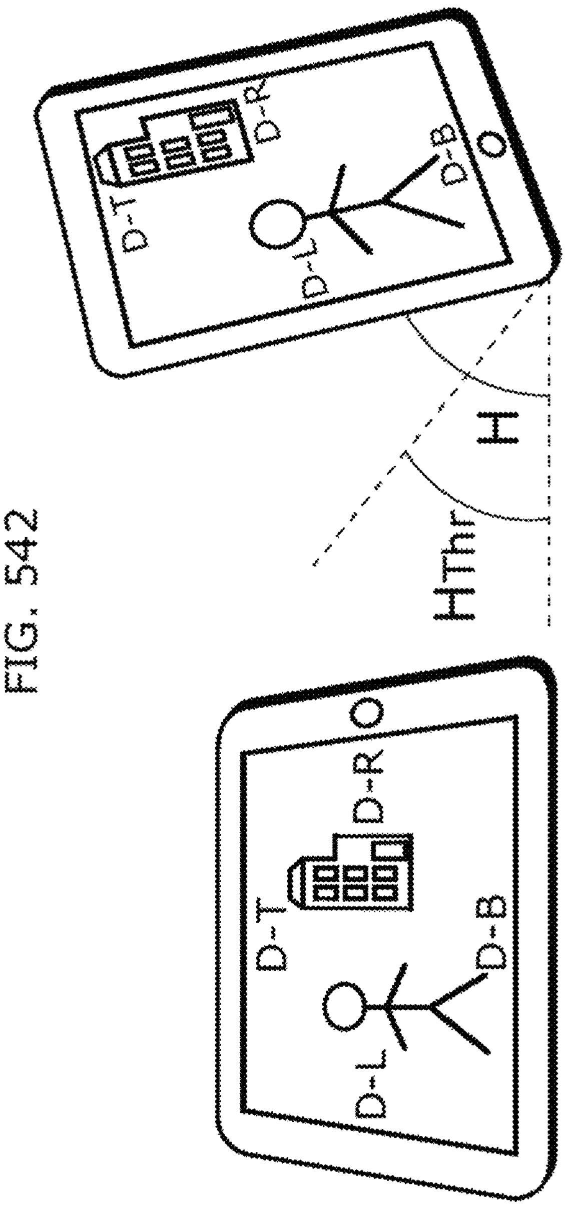

FIG. 542 is a diagram showing definitions of variables relating to horizontal and vertical postures of a mobile terminal, which are used in description of Embodiment D5 of the present invention.

Figure 543:
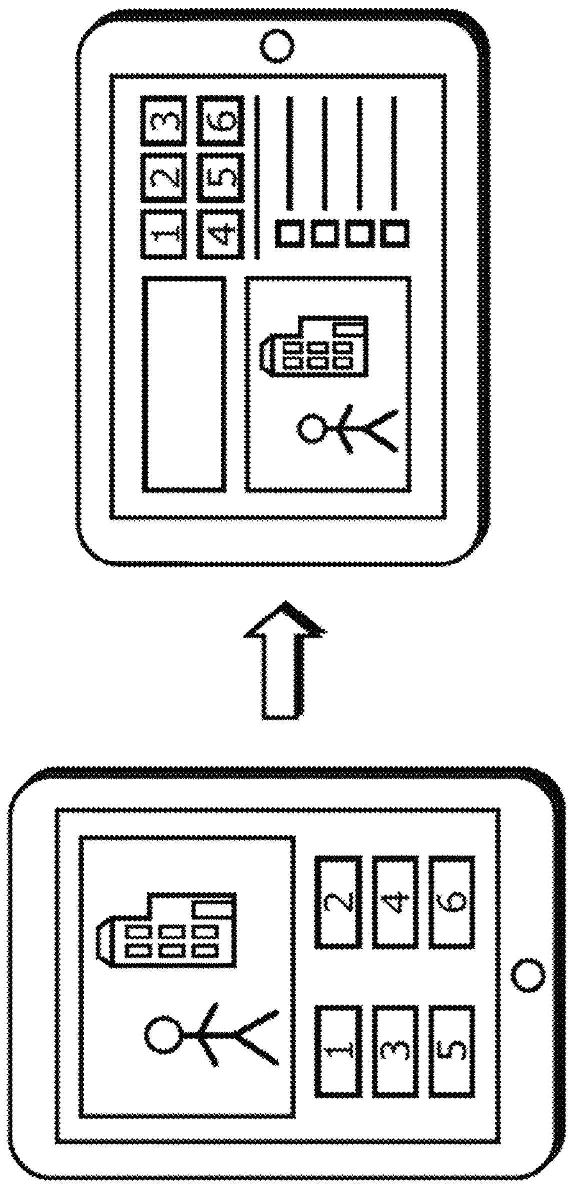

FIG. 543 is a diagram showing an example of a menu screen in the case of operating a mobile terminal according to Embodiment D5 of the present invention as a TV remote controller.

Figure 544:
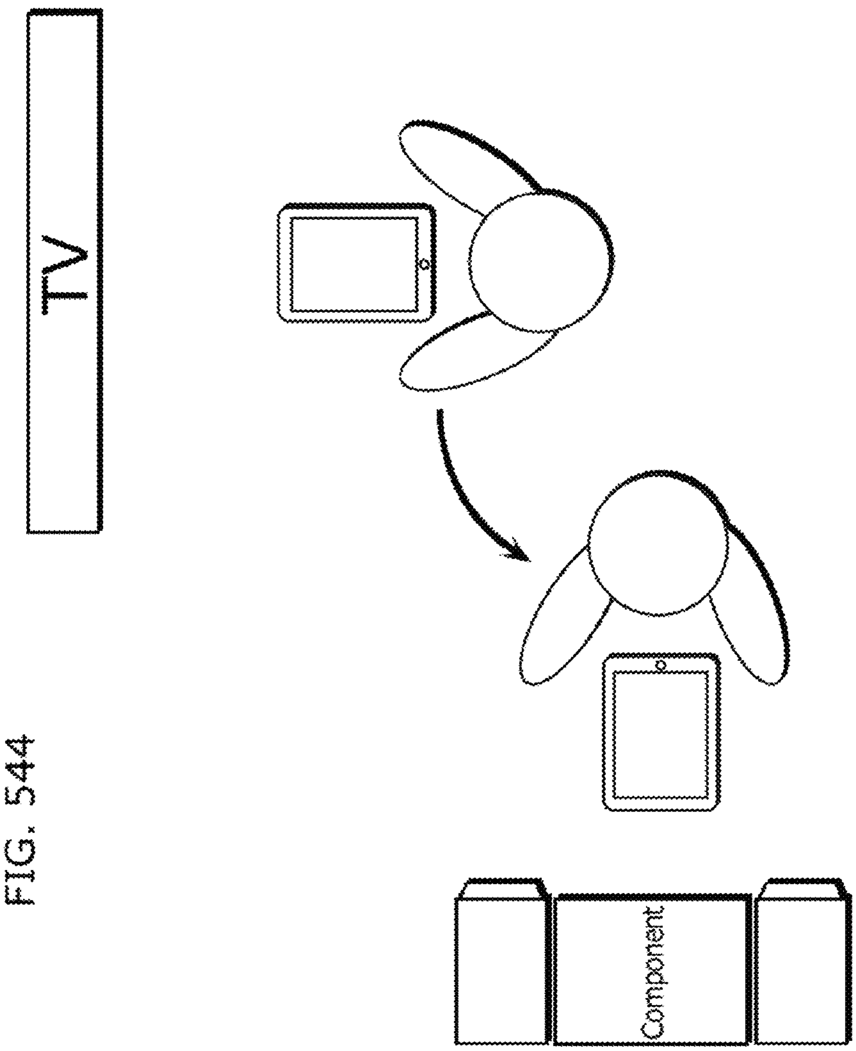

FIG. 544 is a diagram showing a use case example in the case of operating the mobile terminal according to Embodiment D5 of the present invention as a TV remote controller.

FIG. 545 is a diagram showing a use case example in the case of operating the mobile terminal according to Embodiment D5 of the present invention as a TV remote controller.

Figure 546:
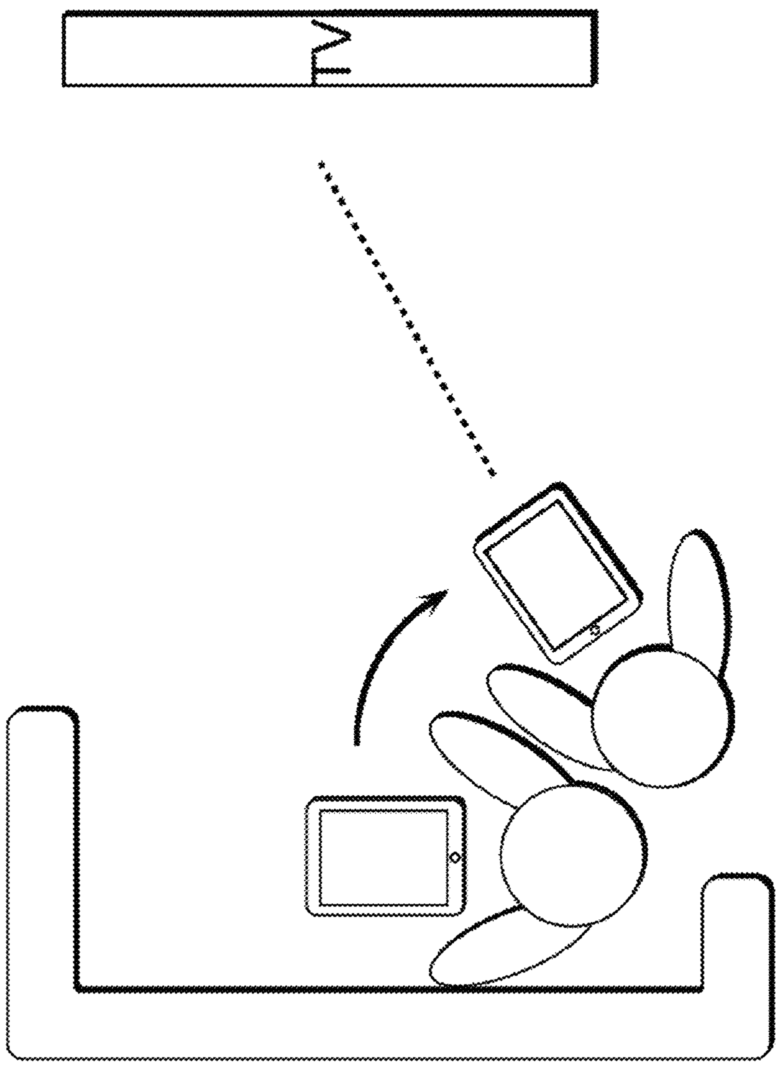

FIG. 546 is a diagram showing a use case example in the case of operating the mobile terminal according to Embodiment D5 of the present invention as a TV remote controller.

Figure 547:
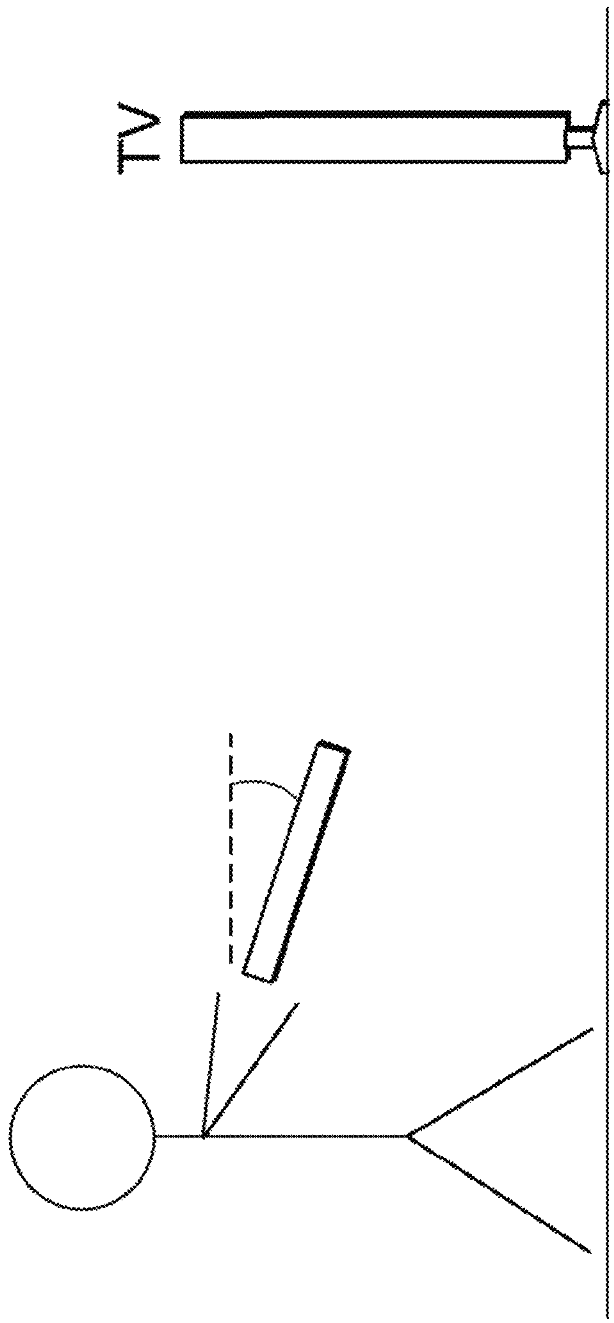

FIG. 547 is a diagram showing a use case example in the case of operating the mobile terminal according to Embodiment D5 of the present invention as a TV remote controller.

Figure 548:
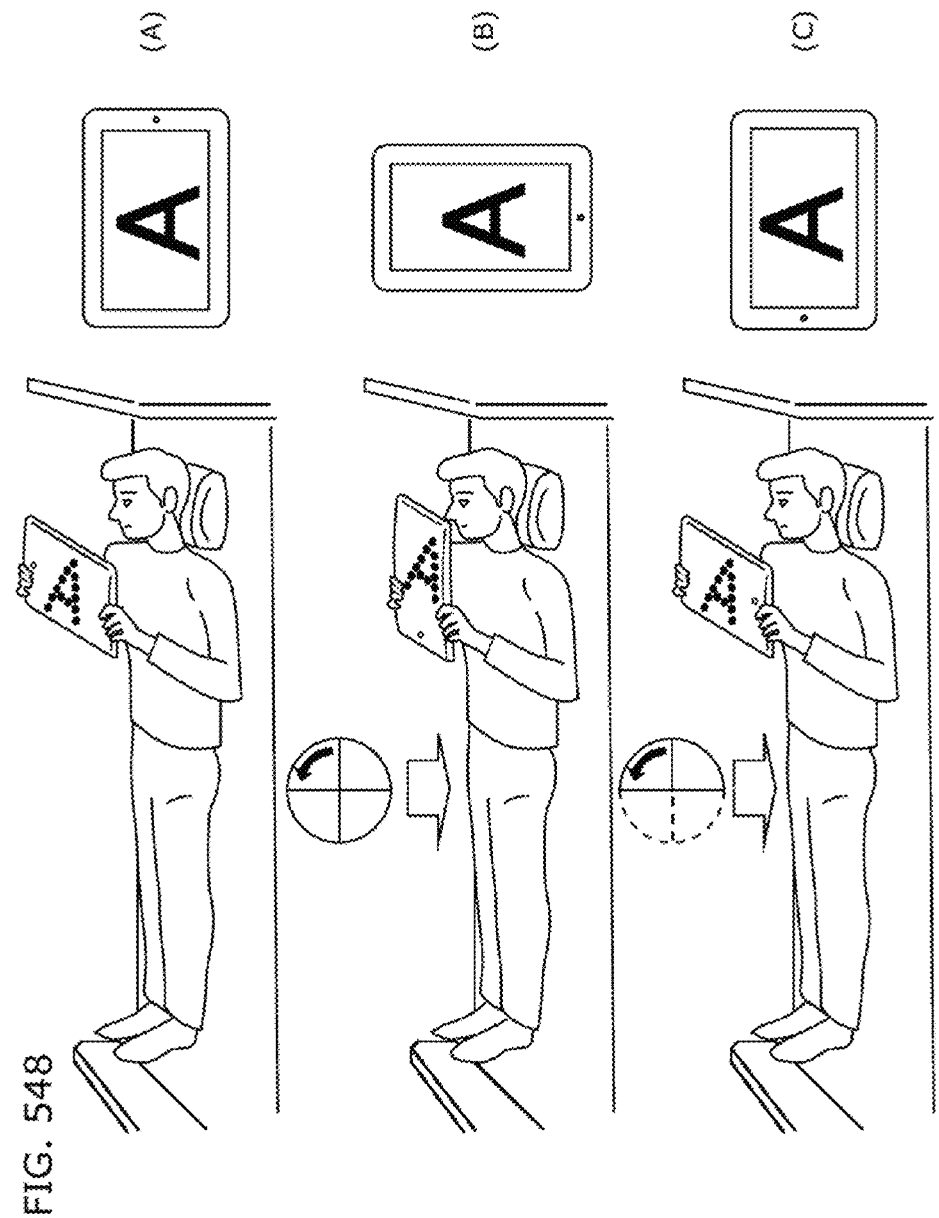

FIG. 548 is a diagram showing a use case example of another operation of the mobile terminal according to Embodiment D5 of the present invention.

Figure 549:
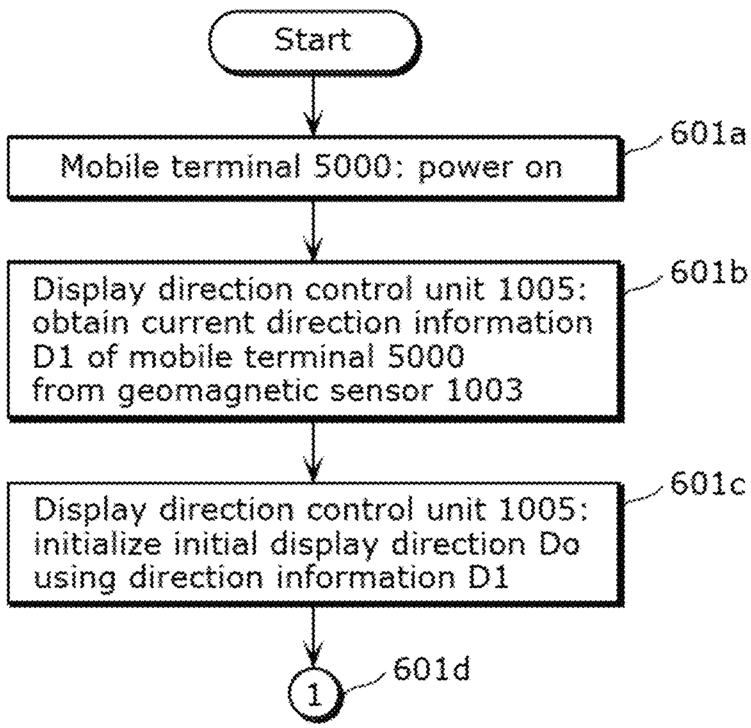

FIG. 549 is a diagram showing control flow of the mobile terminal according to Embodiment D5 of the present invention.

Figure 550:
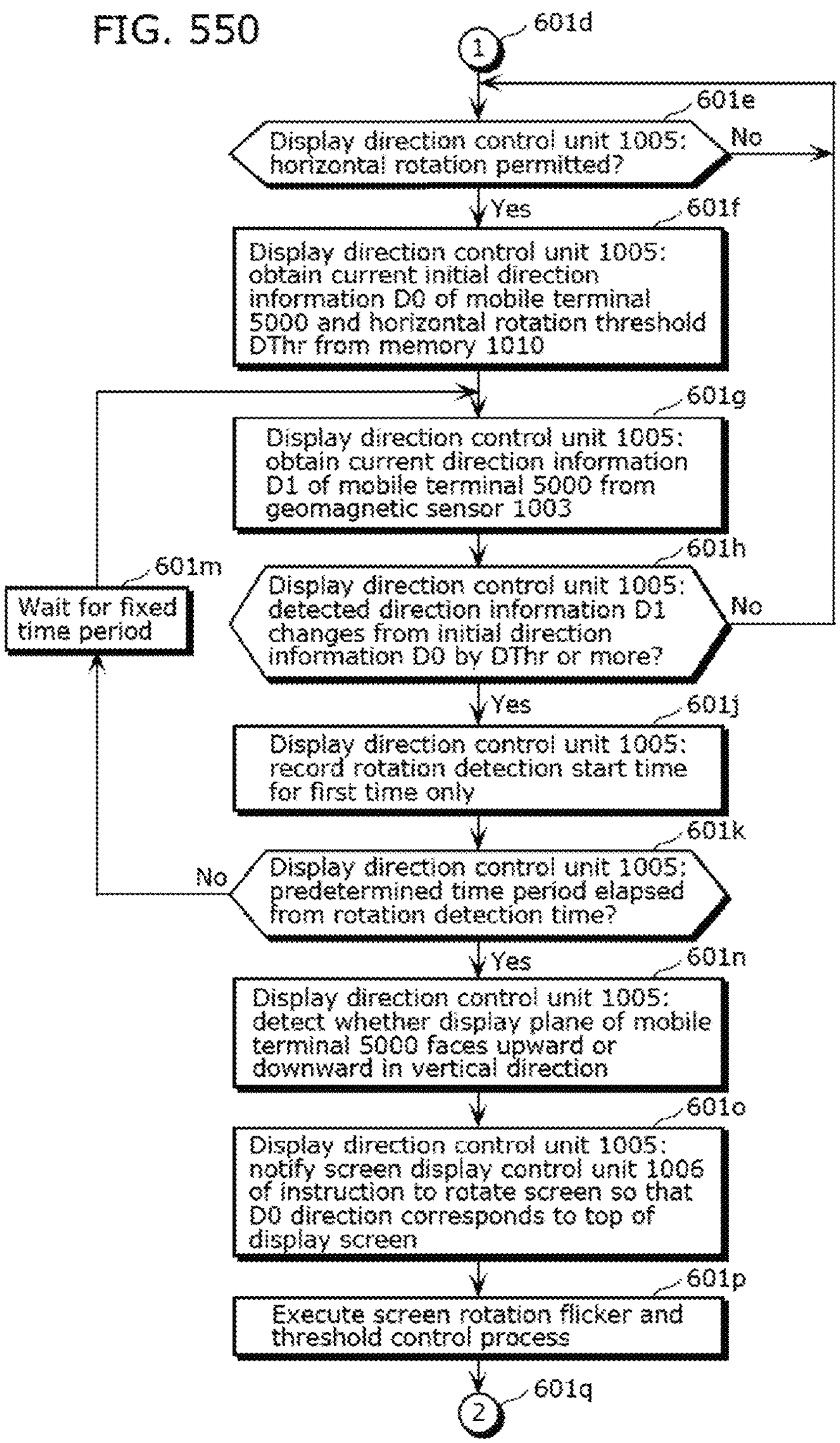

FIG. 550 is a diagram showing control flow of the mobile terminal according to Embodiment D5 of the present invention.

Figure 551:
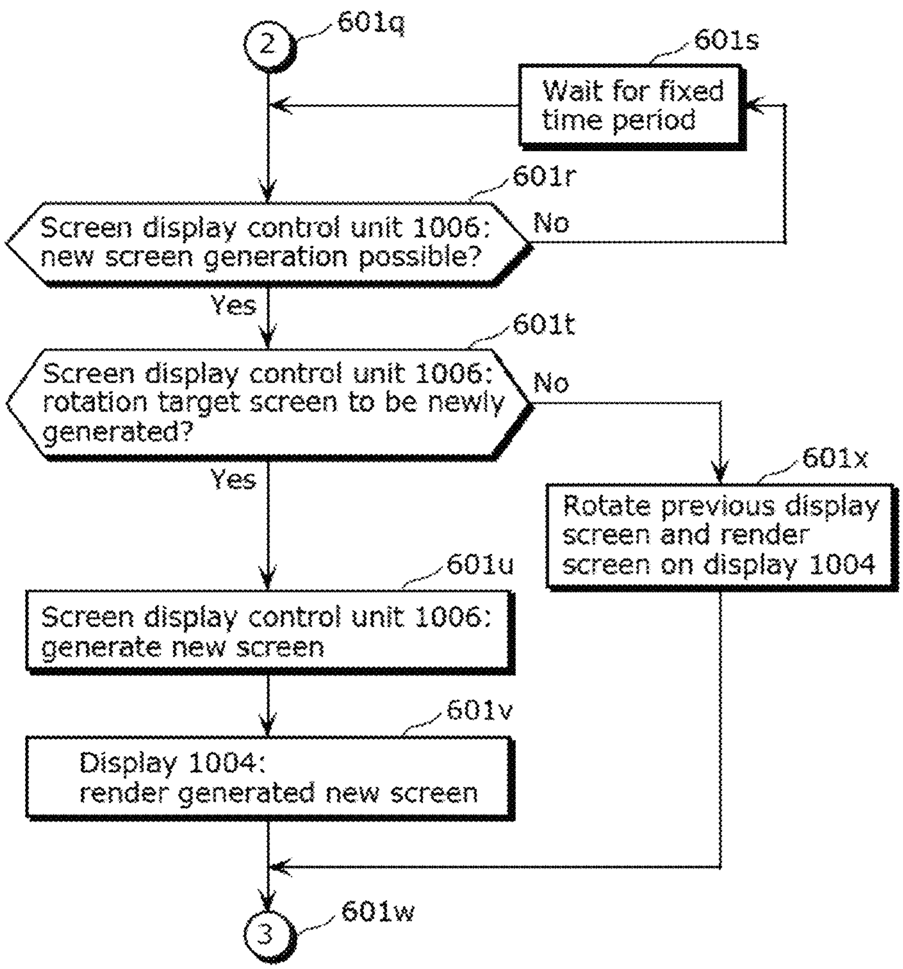

FIG. 551 is a diagram showing control flow of the mobile terminal according to Embodiment D5 of the present invention.

Figure 552:
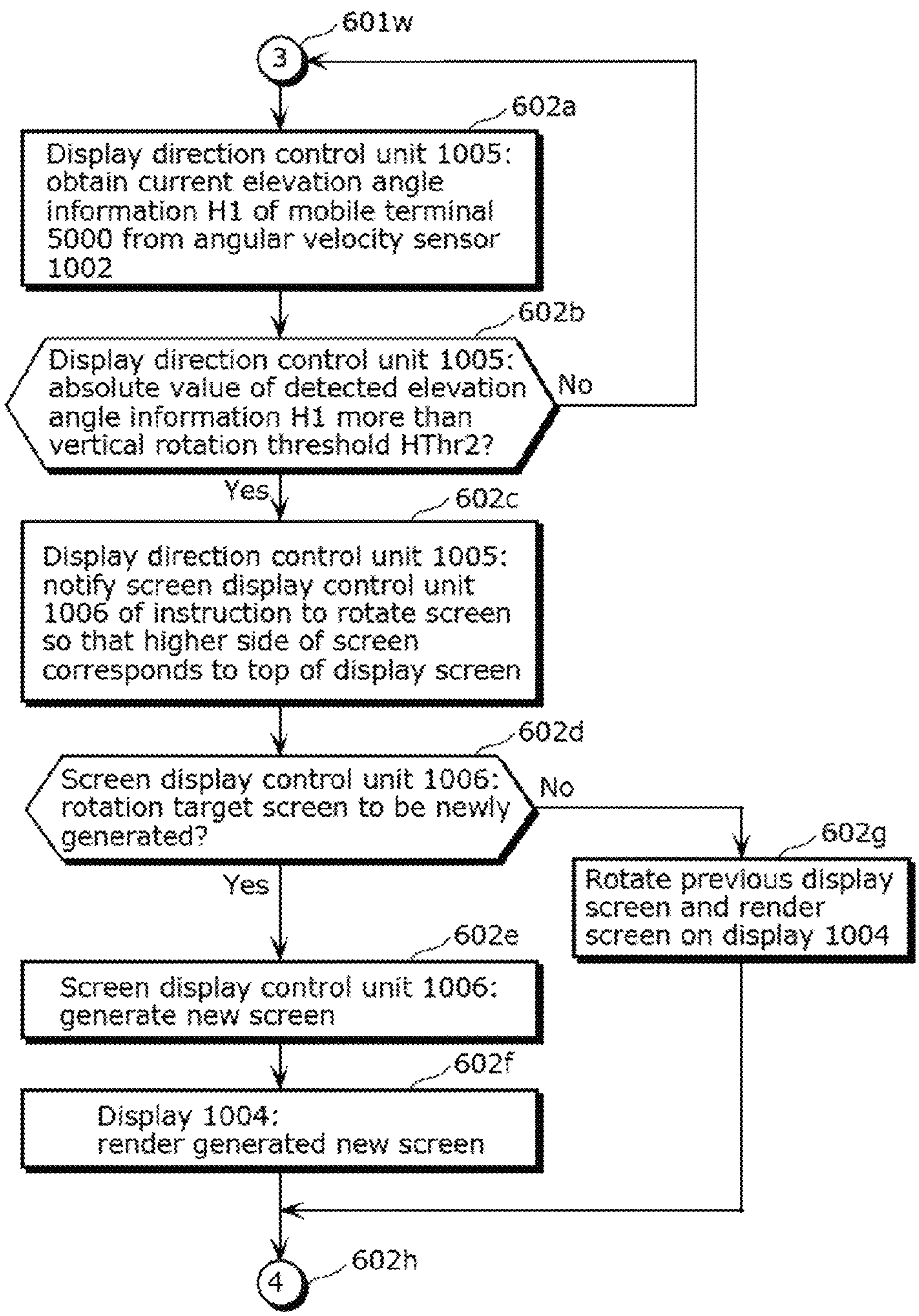

FIG. 552 is a diagram showing control flow of the mobile terminal according to Embodiment D5 of the present invention.

Figure 553:
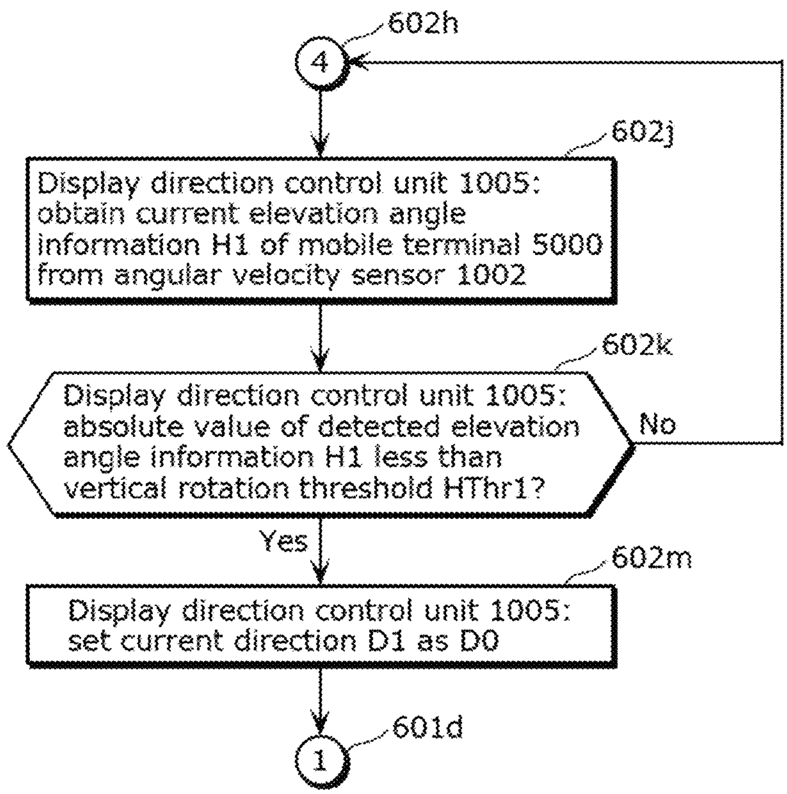

FIG. 553 is a diagram showing control flow of the mobile terminal according to Embodiment D5 of the present invention.

Figure 554:
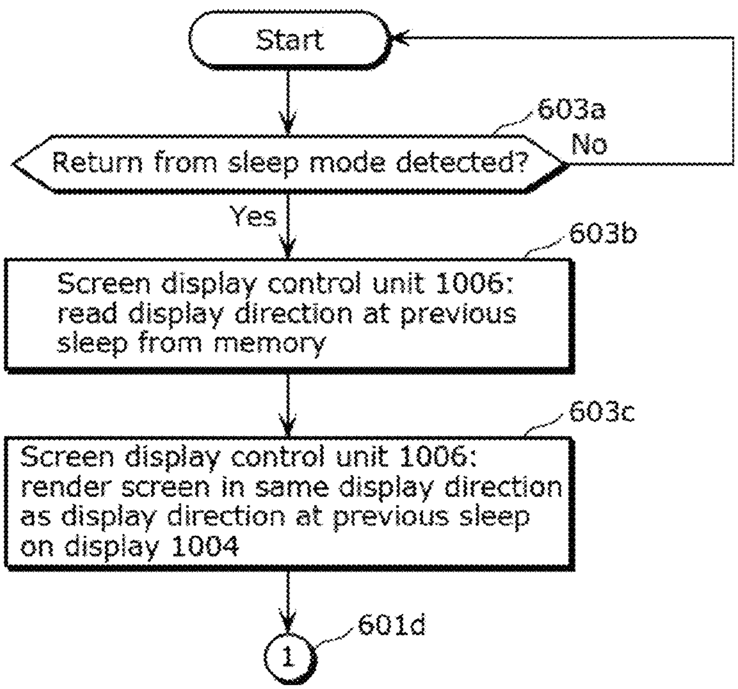

FIG. 554 is a diagram showing control flow of the mobile terminal according to Embodiment D5 of the present invention.

Figure 555:
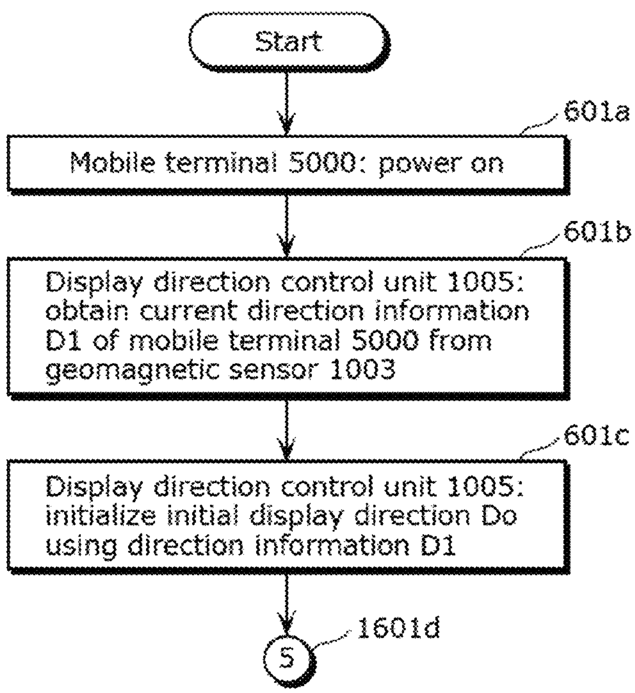

FIG. 555 is a diagram showing another control flow of the mobile terminal according to Embodiment D5 of the present invention.

Figure 556:
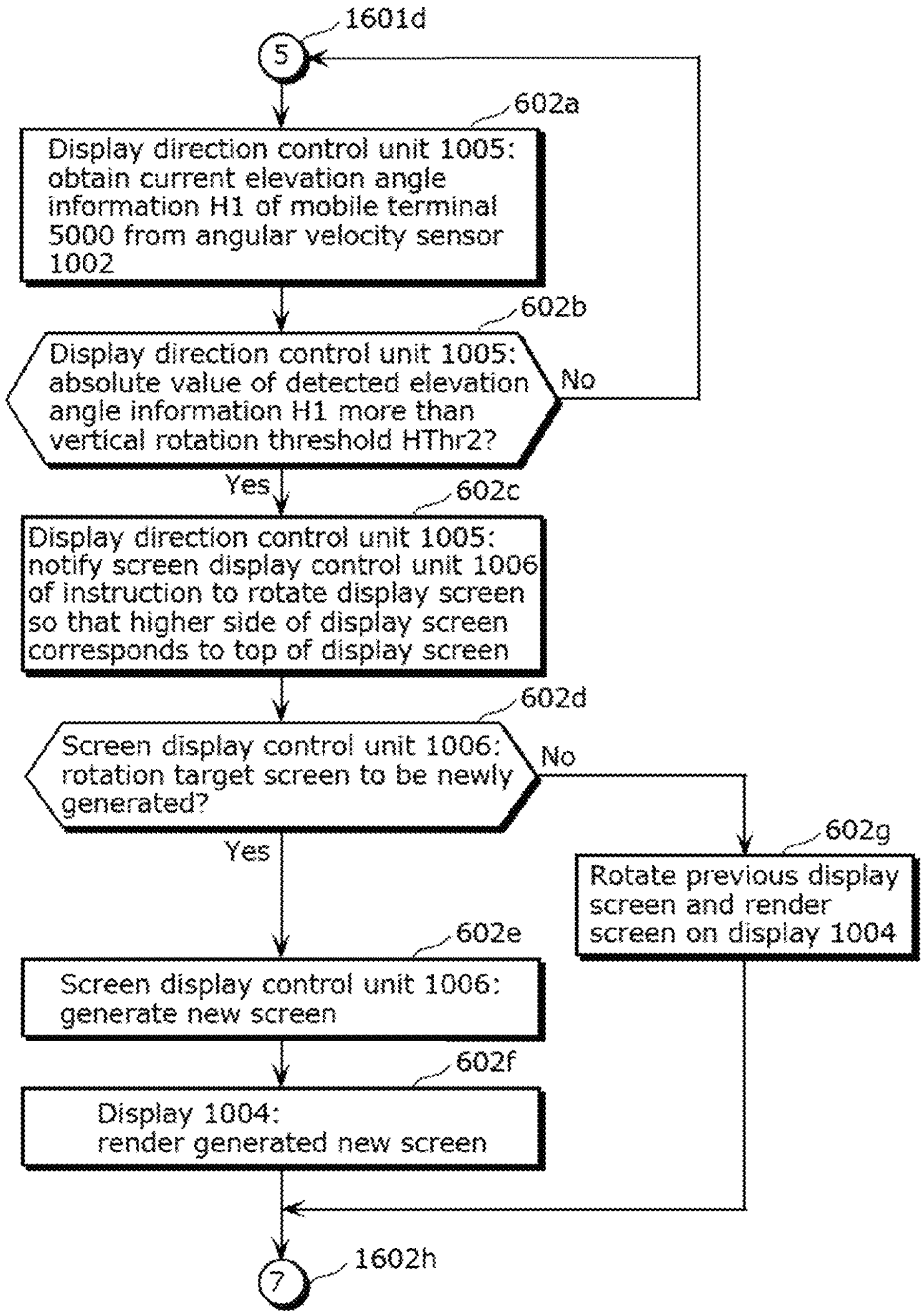

FIG. 556 is a diagram showing another control flow of the mobile terminal according to Embodiment D5 of the present invention.

Figure 557:
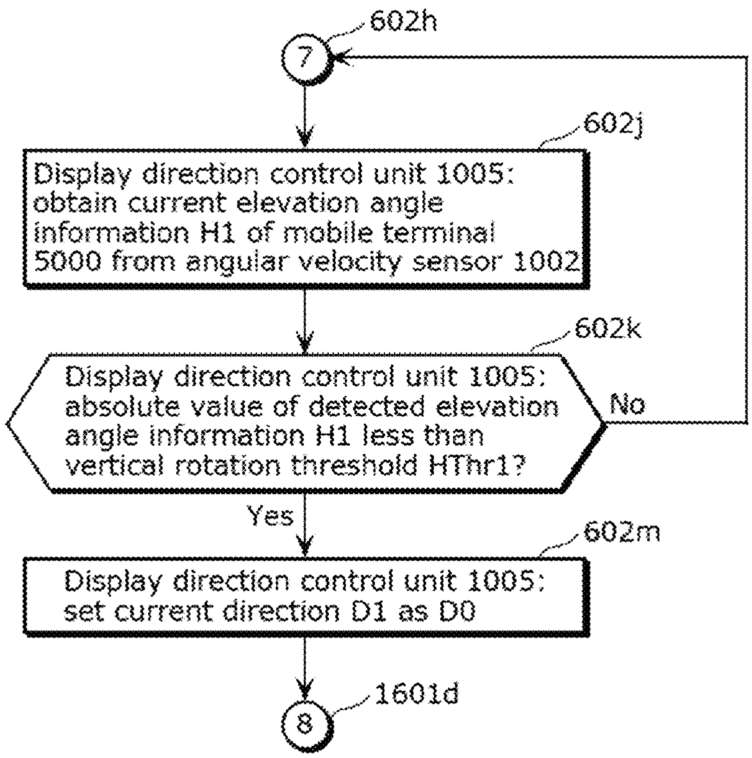

FIG. 557 is a diagram showing another control flow of the mobile terminal according to Embodiment D5 of the present invention.

Figure 558:
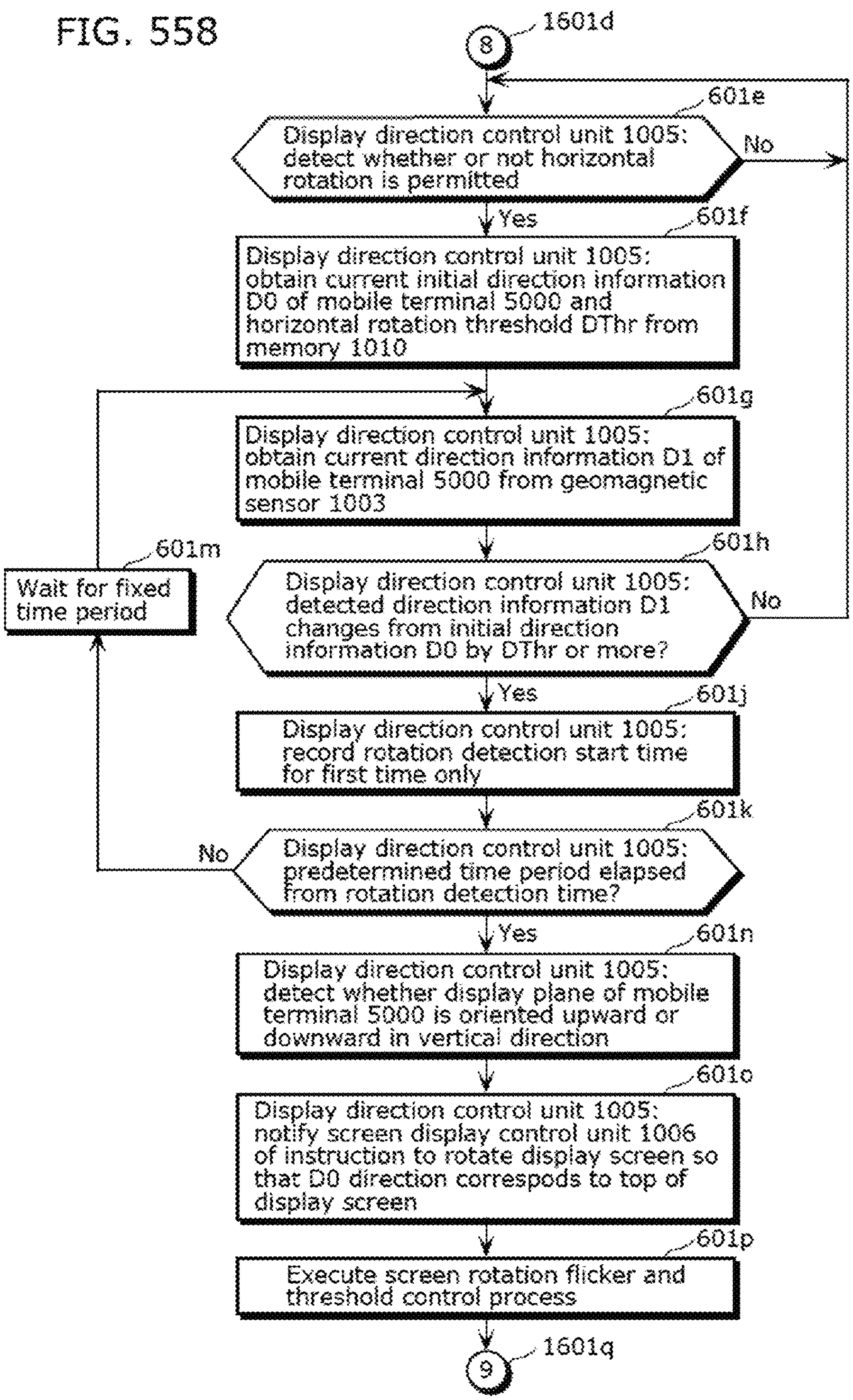

FIG. 558 is a diagram showing another control flow of the mobile terminal according to Embodiment D5 of the present invention.

Figure 559:
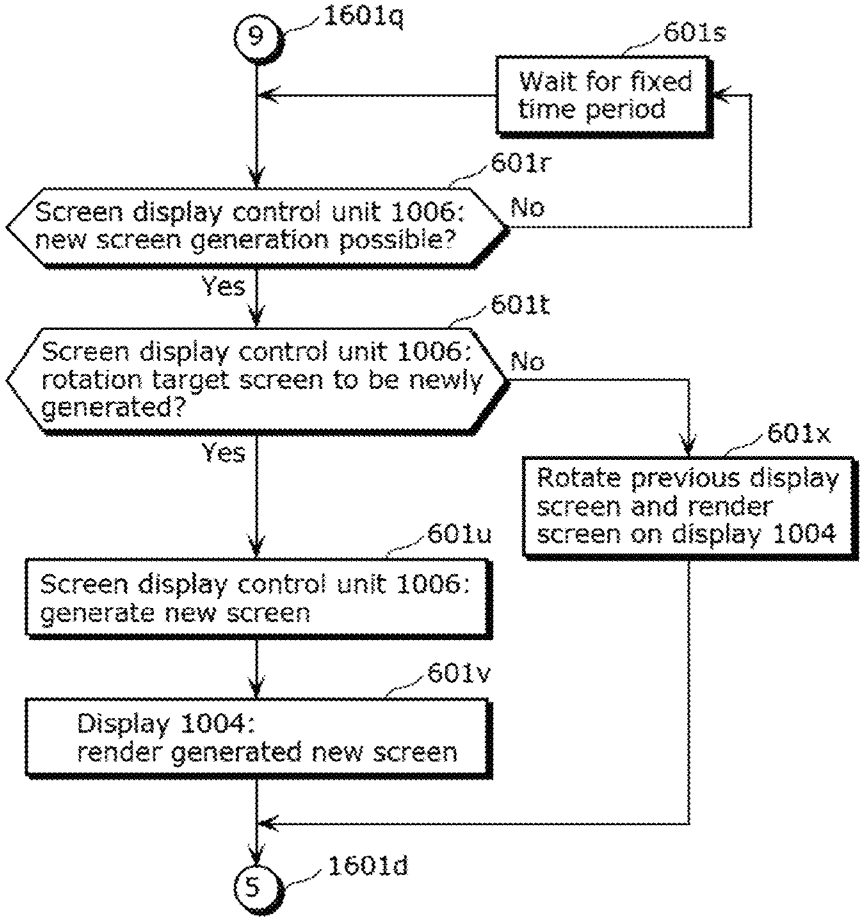

FIG. 559 is a diagram showing another control flow of the mobile terminal according to Embodiment D5 of the present invention.

Figure 560:
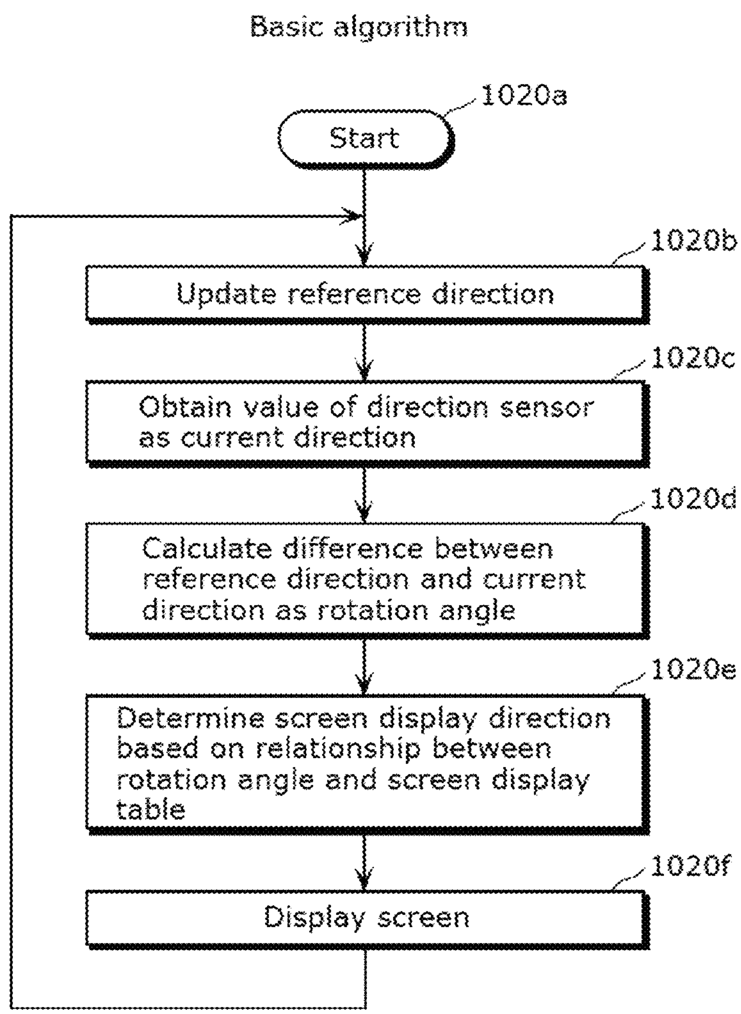

FIG. 560 is a diagram showing an operation in the case of using the mobile device according to Embodiment D5 of the present invention.

Figure 561:
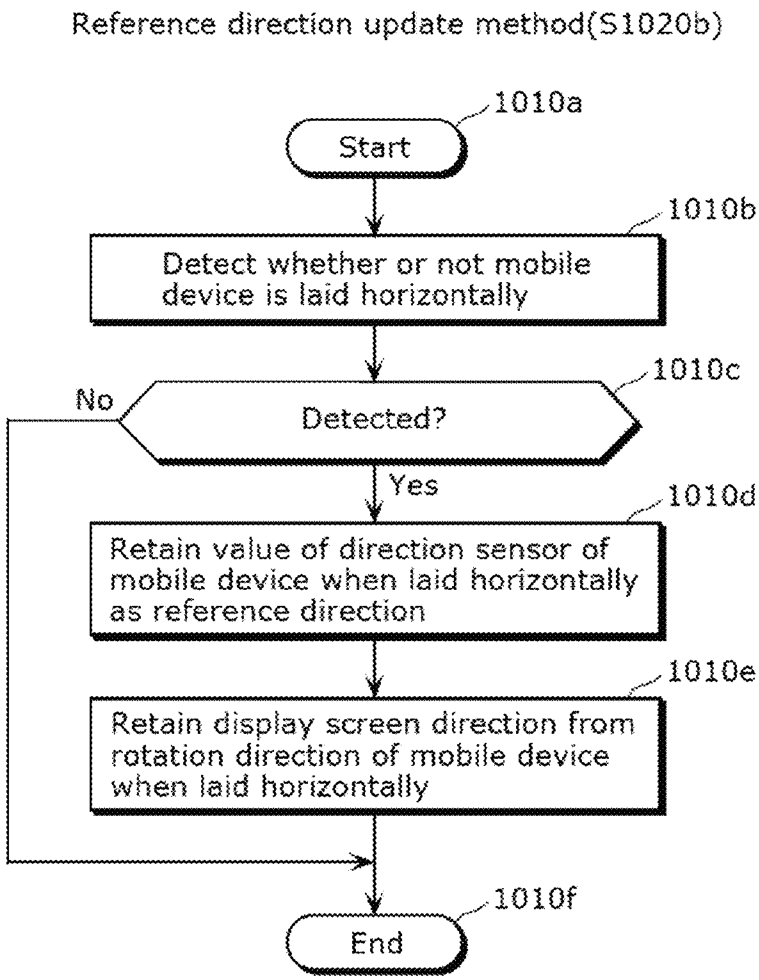

FIG. 561 is a flow diagram showing a method of updating a reference direction of the mobile device according to Embodiment D5 of the present invention.

Figure 562:
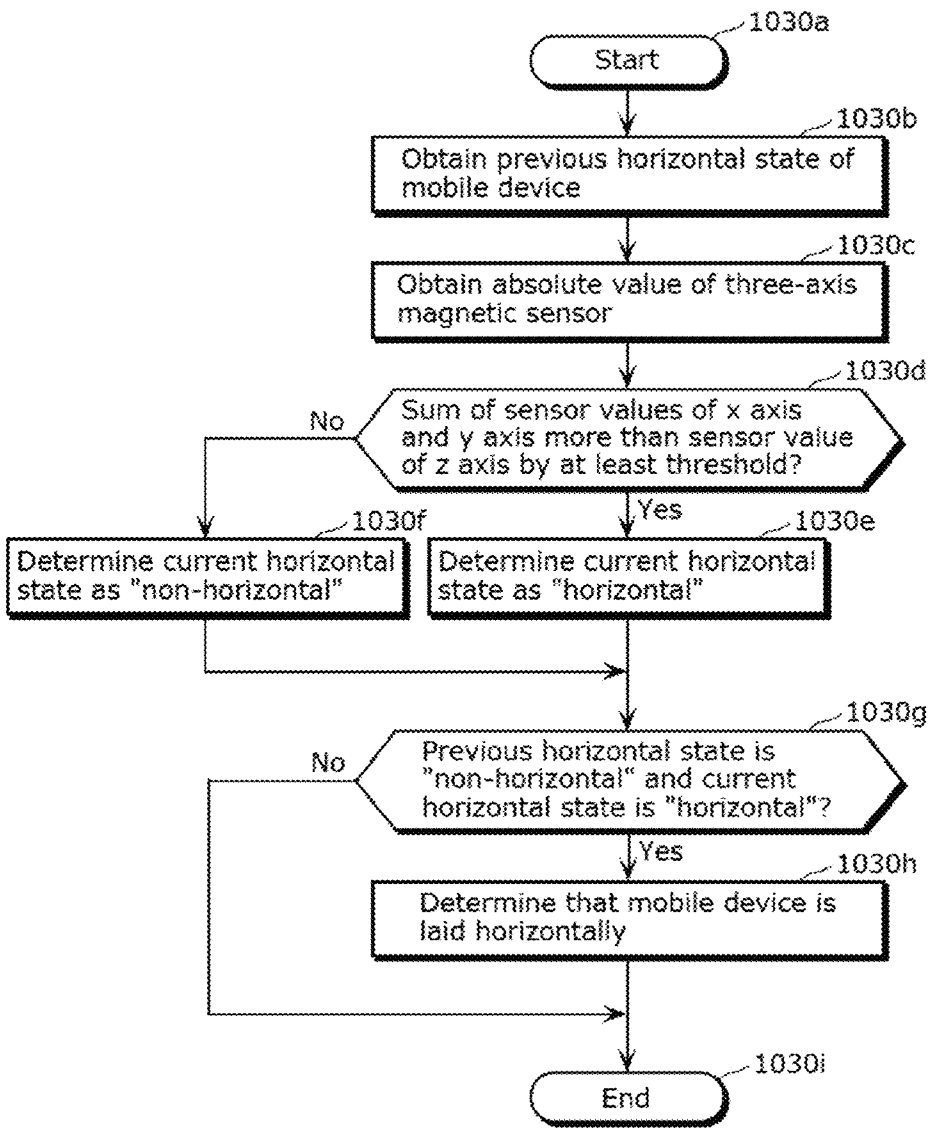

FIG. 562 is a flow diagram showing a method of detecting horizontal laying of the mobile device according to Embodiment D5 of the present invention.

Figure 563:
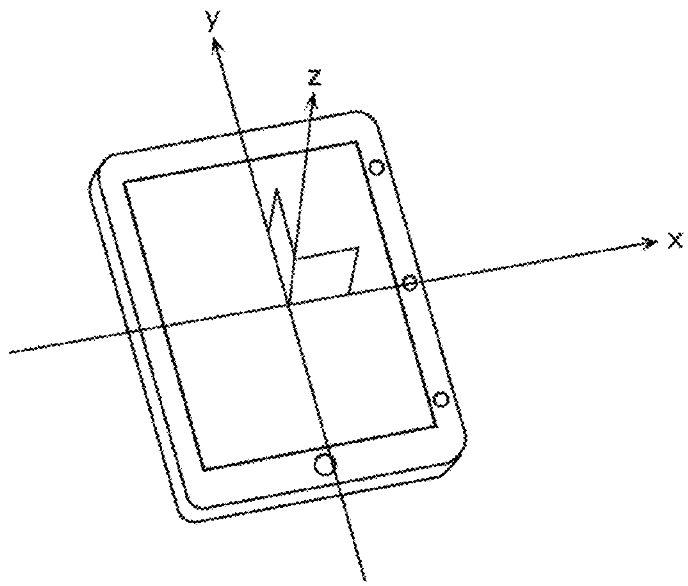

FIG. 563 is a diagram showing an example of directions of three axes of a magnetic sensor of the mobile device according to Embodiment D5 of the present invention.

Figure 564:
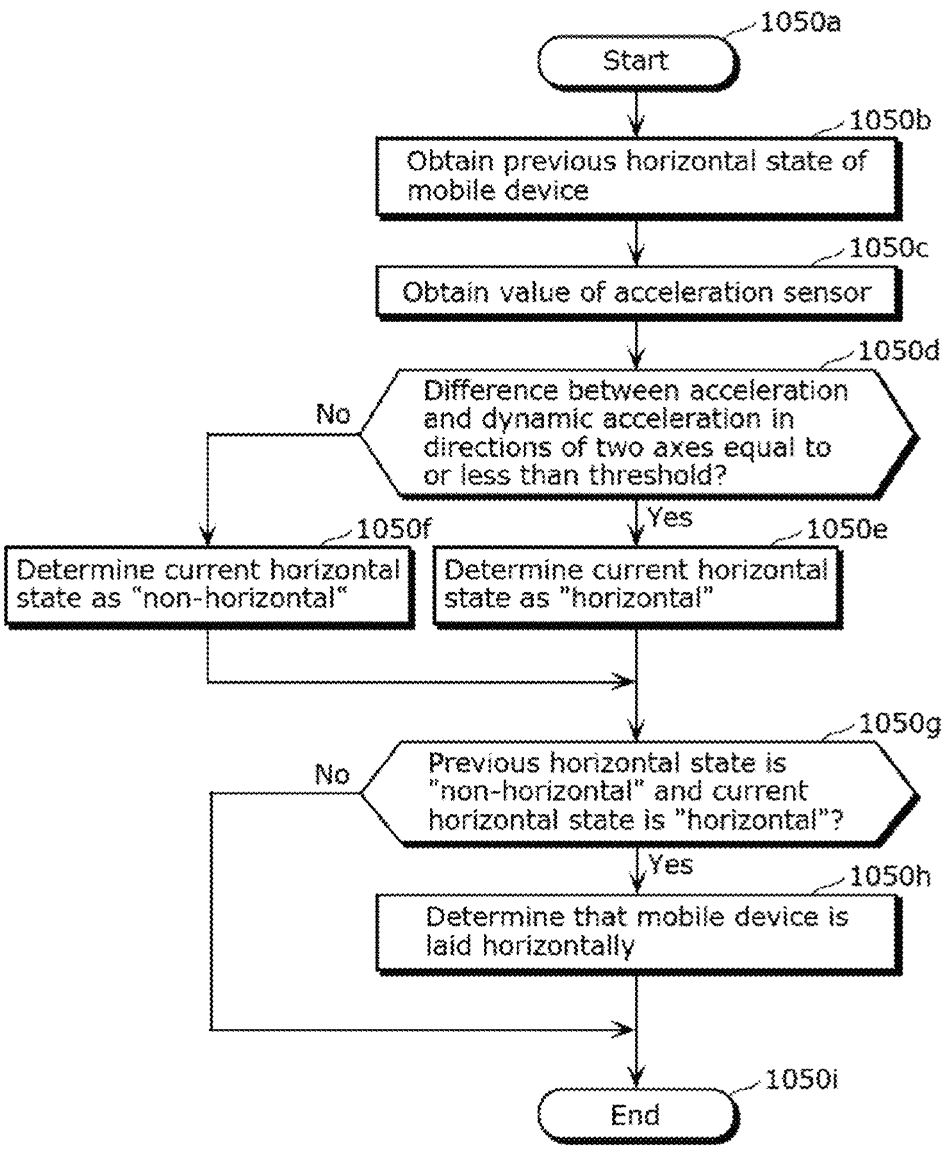

FIG. 564 is a diagram showing a method of detecting horizontal laying of the mobile device using an acceleration sensor according to Embodiment D5 of the present invention.

Figure 565:
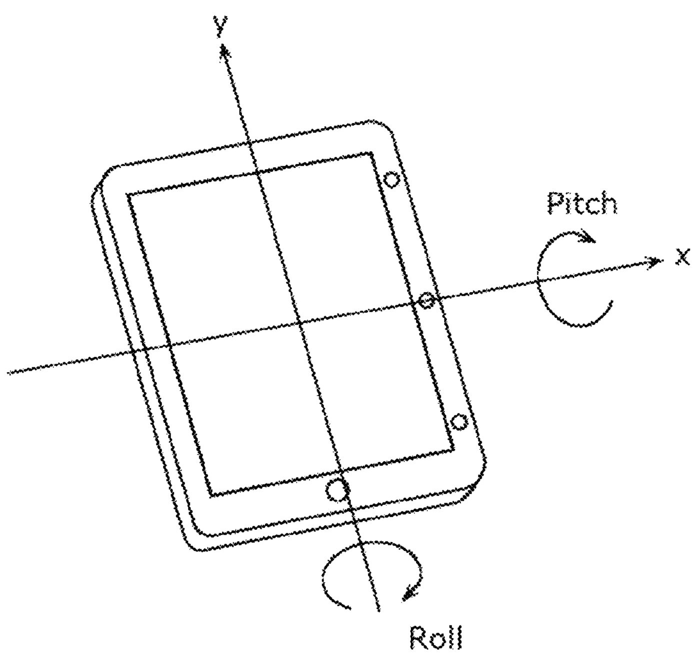

FIG. 565 is a diagram showing an example of directions of three axes of the magnetic sensor of the mobile device according to Embodiment D5 of the present invention.

Figure 566:
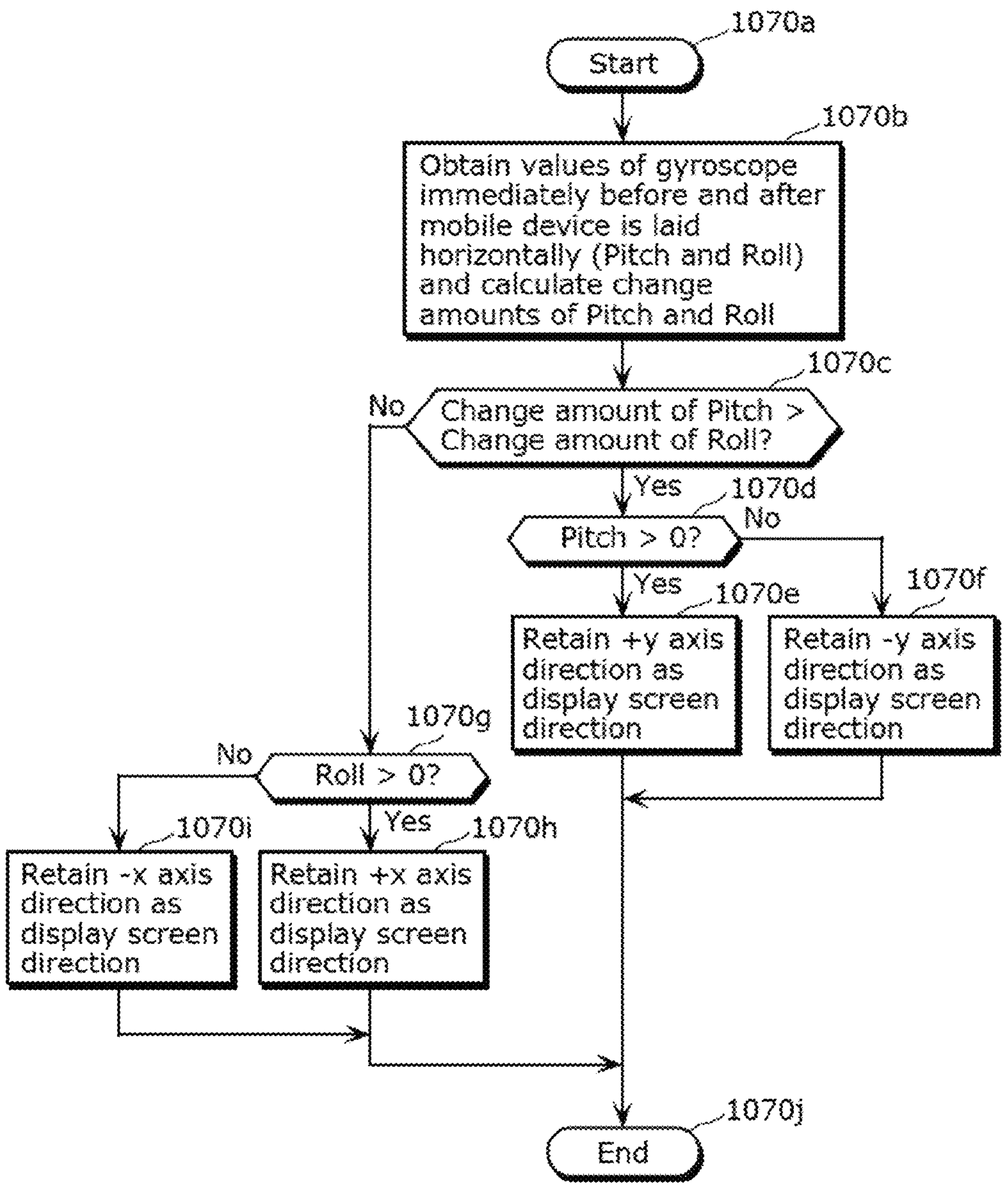

FIG. 566 is a diagram showing a screen display direction of the mobile device according to Embodiment D5 of the present invention.

FIG. 567 is a diagram showing a screen display direction change table of the mobile device according to Embodiment D5 of the present invention.

Figure 568:
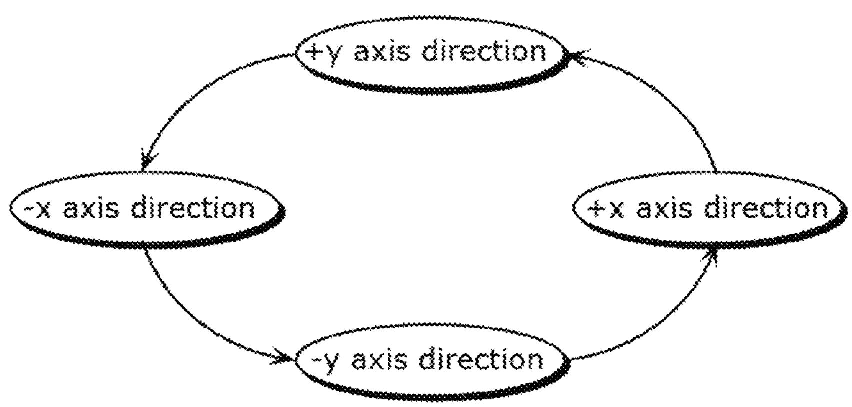

FIG. 568 is a diagram showing screen display direction transitions of the mobile device according to Embodiment D5 of the present invention.

Figure 569:
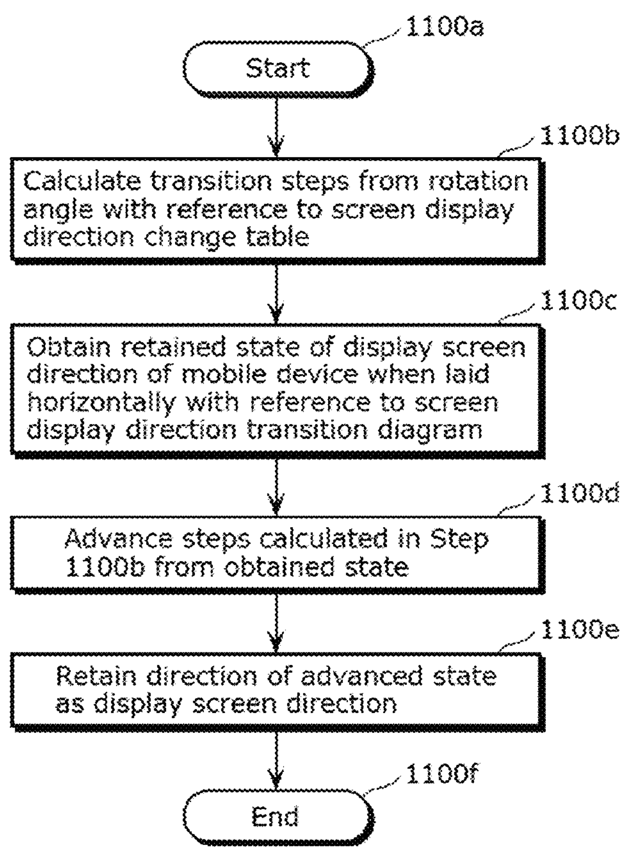

FIG. 569 is a diagram showing a screen display direction of the mobile device according to Embodiment D5 of the present invention.

Figure 570:
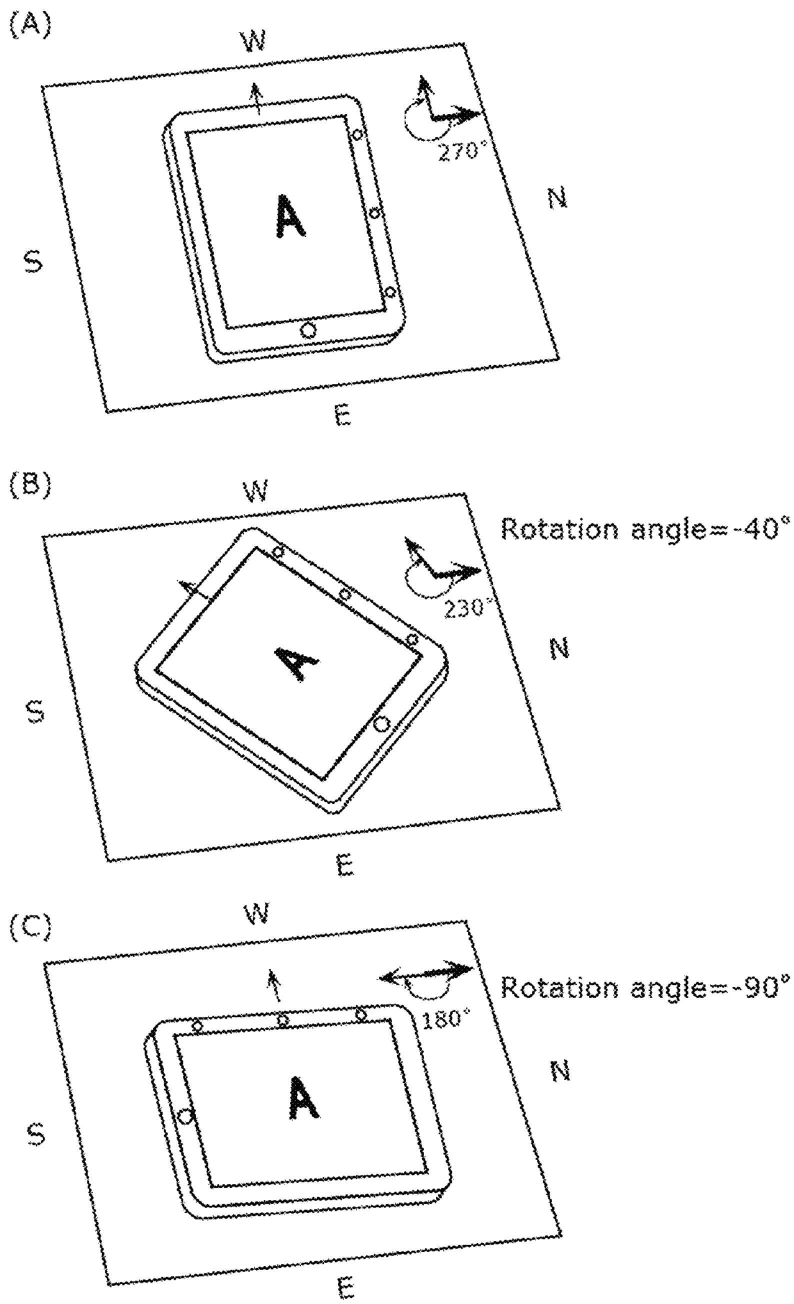

FIG. 570 is a diagram showing a direction of the mobile device in the case of rotating the mobile device according to Embodiment D5 of the present invention.

Figure 571:
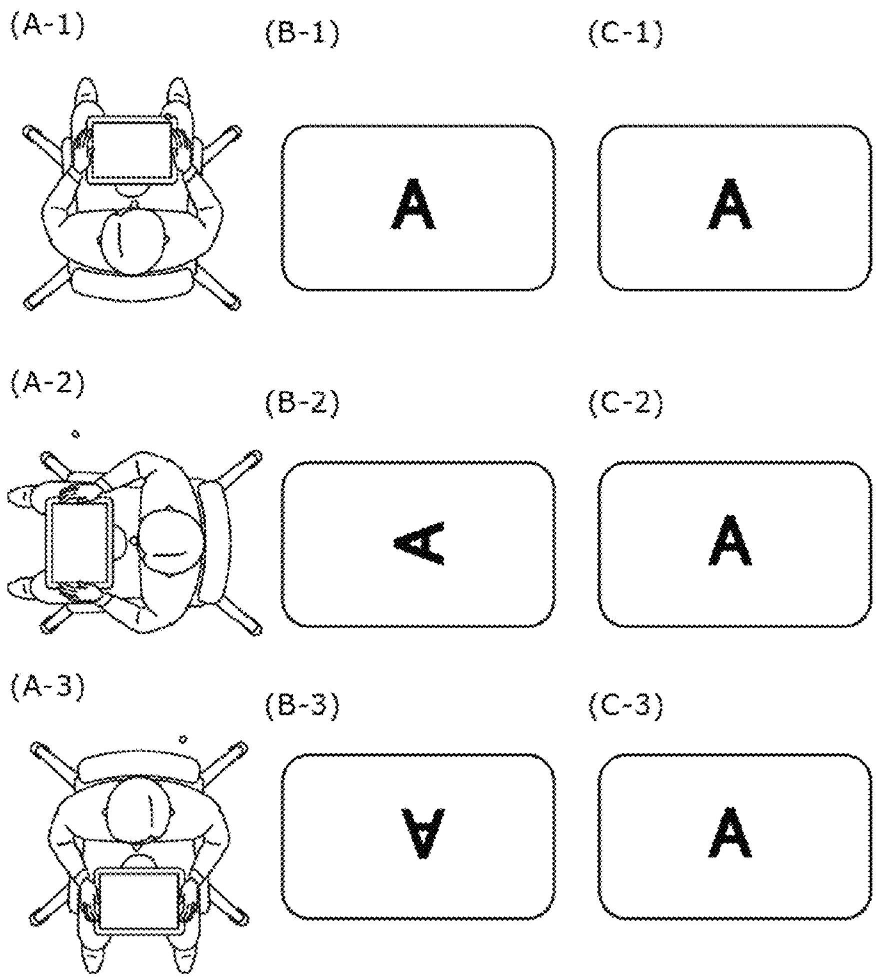

FIG. 571 is a diagram showing display of the mobile device in the case where a person views the mobile device according to Embodiment D5 of the present invention.

Figure 572:
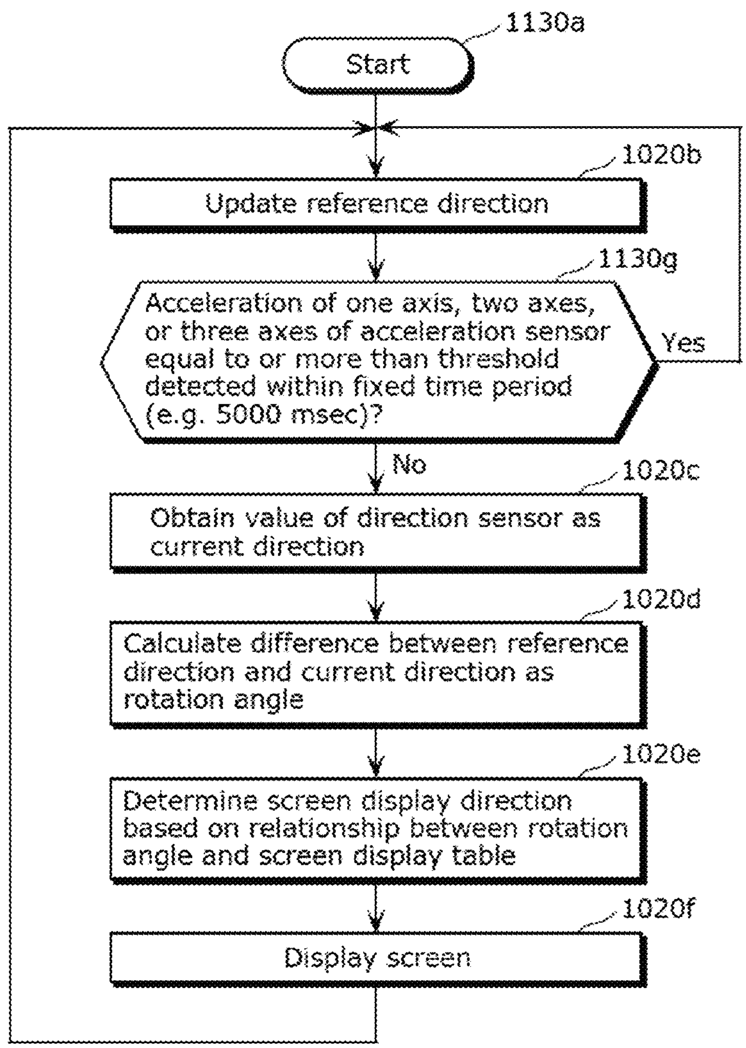

FIG. 572 is a diagram showing flow in the case where a person rotates while holding a tablet which is one aspect of the mobile device according to Embodiment D5 of the present invention.

Figure 573:
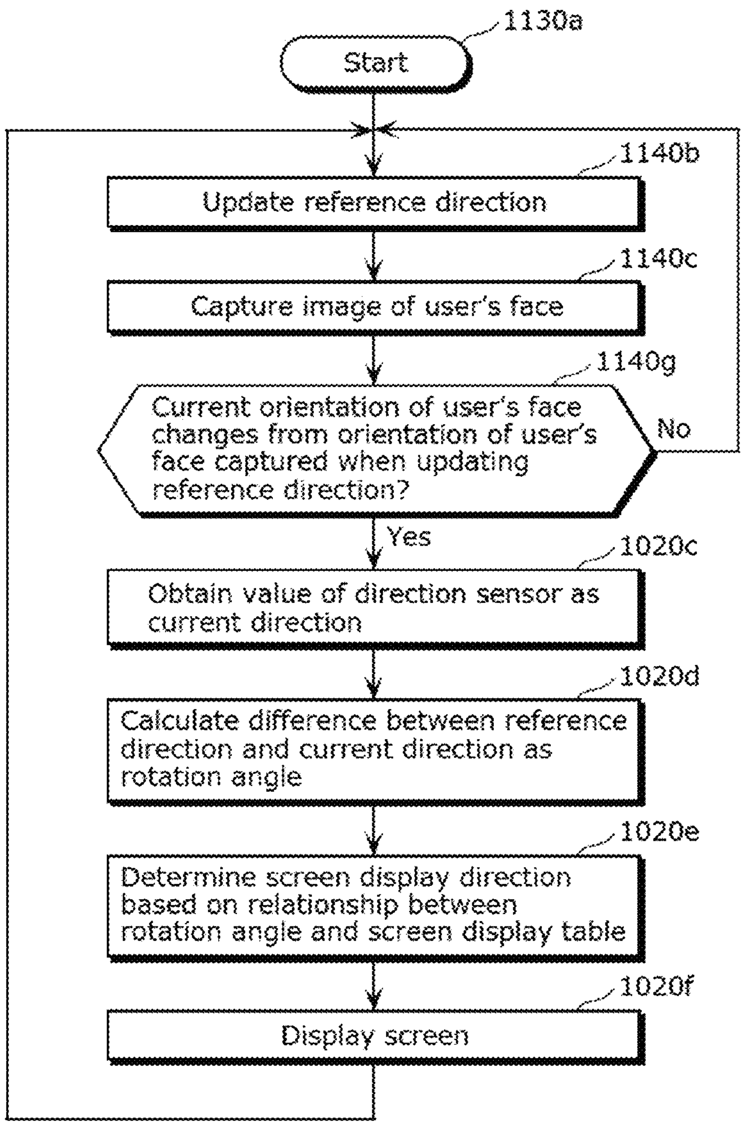

FIG. 573 is a diagram showing flow in the case where a person rotates while holding a tablet which is one aspect of the mobile device according to Embodiment D5 of the present invention.

Figure 574:
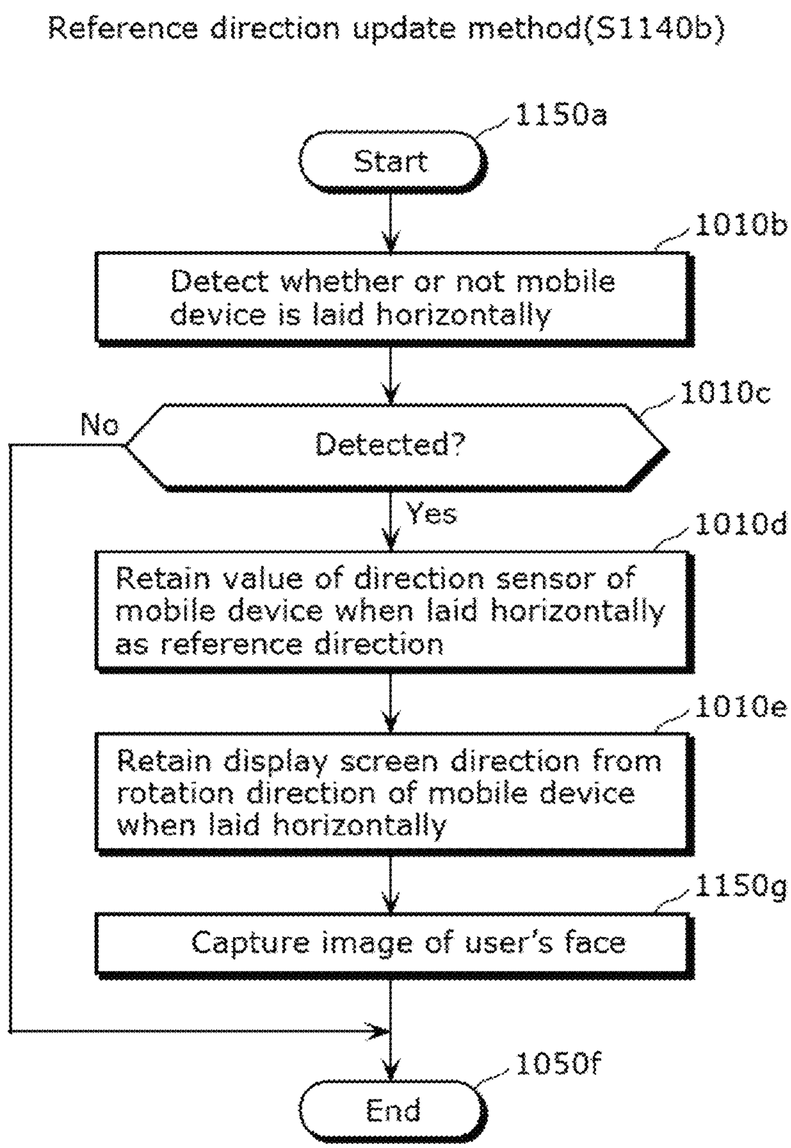

FIG. 574 is a flow diagram showing a method of updating a reference direction of the mobile device according to Embodiment D5 of the present invention.

Figure 575:
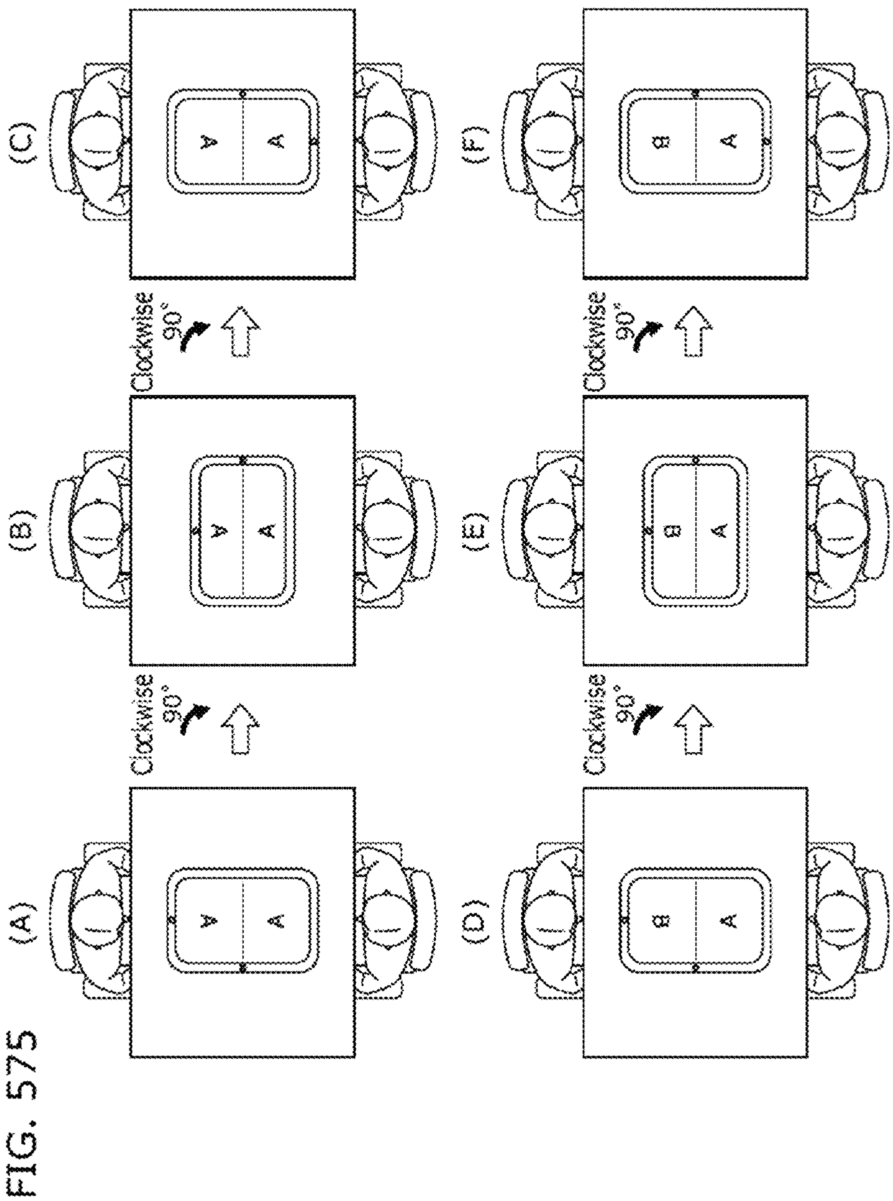

FIG. 575 is a diagram showing display of the mobile device in the case where persons facing each other view the mobile device according to Embodiment D5 of the present invention.

Figure 576:
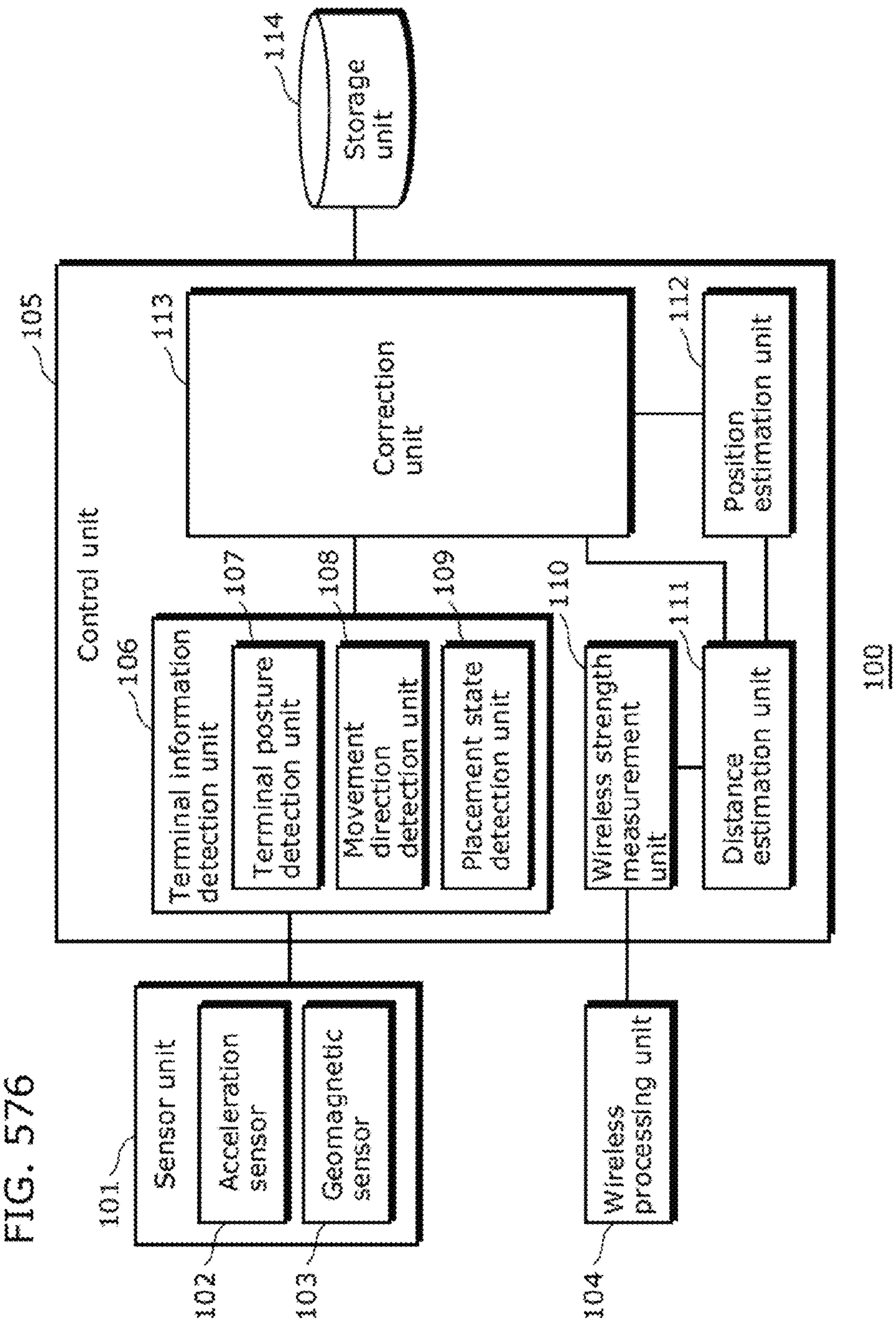

FIG. 576 is a block diagram showing a structure of a position estimation device according to Embodiment E1 of the present invention.

Figure 577:
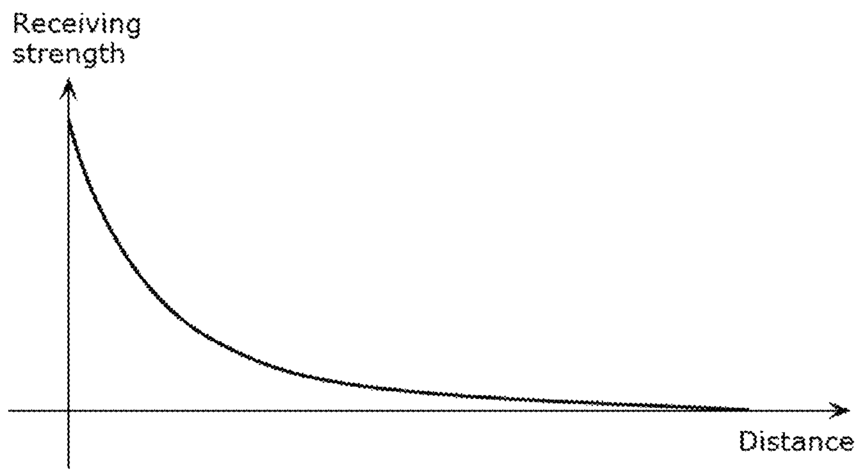

FIG. 577 is a diagram showing an example of a graph of a relationship between an electric field strength and a distance.

Figure 578:
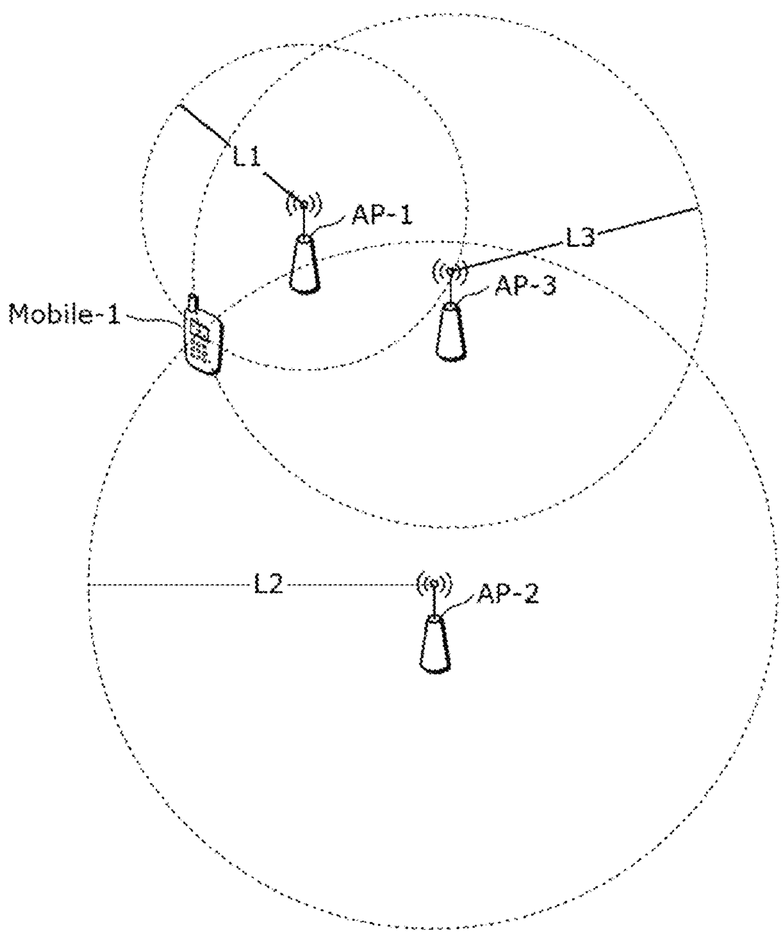

FIG. 578 is a diagram showing an example of a method of estimating a current position of a wireless terminal using distance information.

FIG. 579 is a diagram showing an example of a model pattern of acceleration information in each placement state of the wireless terminal according to Embodiment E1 of the present invention.

FIG. 580 is a diagram showing a specific example of detected terminal information of the wireless terminal according to Embodiment E1 of the present invention.

FIG. 581 is a diagram showing an example of base station management information according to Embodiment E1 of the present invention.

FIG. 582 is a diagram showing an example of a measured receiving strength and estimated distance information according to Embodiment E1 of the present invention.

Figure 583:
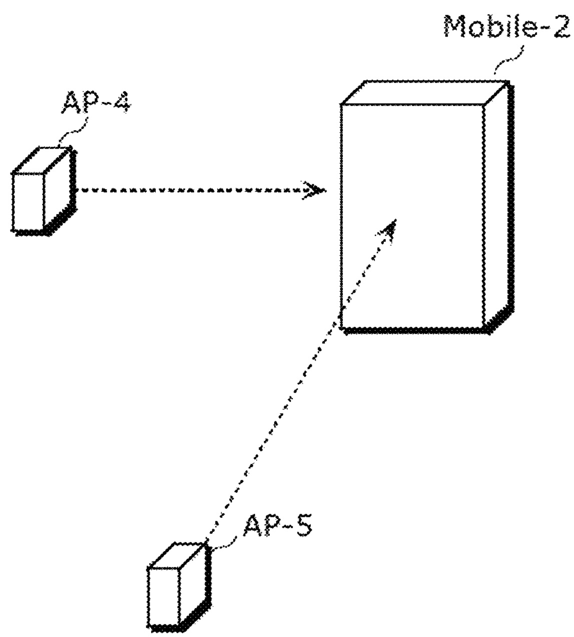

FIG. 583 is a diagram for describing a relationship between a terminal posture and a receiving strength according to Embodiment E1 of the present invention.

FIG. 584 is a diagram showing an example of correspondence between a terminal posture and a correction factor according to Embodiment E1 of the present invention.

Figure 585:
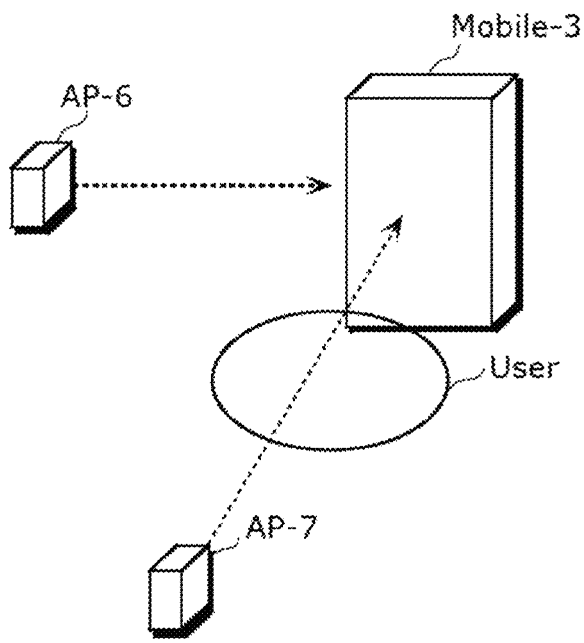

FIG. 585 is a diagram for describing a relationship between a positional relationship of a base station, a wireless terminal, and a user and a receiving strength according to Embodiment E1 of the present invention.

FIG. 586 is a diagram showing an example of correspondence between a positional relationship of a base station, a wireless terminal, and a user and a correction factor according to Embodiment E1 of the present invention.

Figure 587:
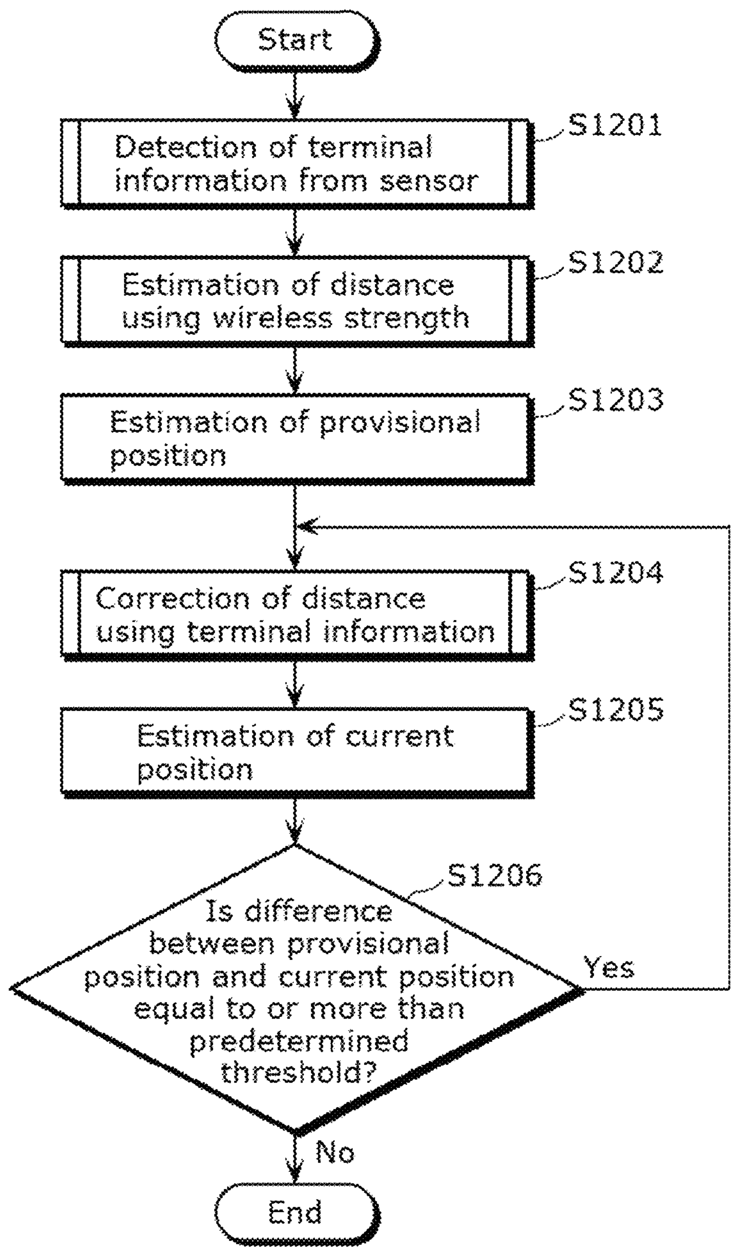

FIG. 587 is a flowchart showing an operation of the position estimation device according to Embodiment E1 of the present invention.

Figure 588:
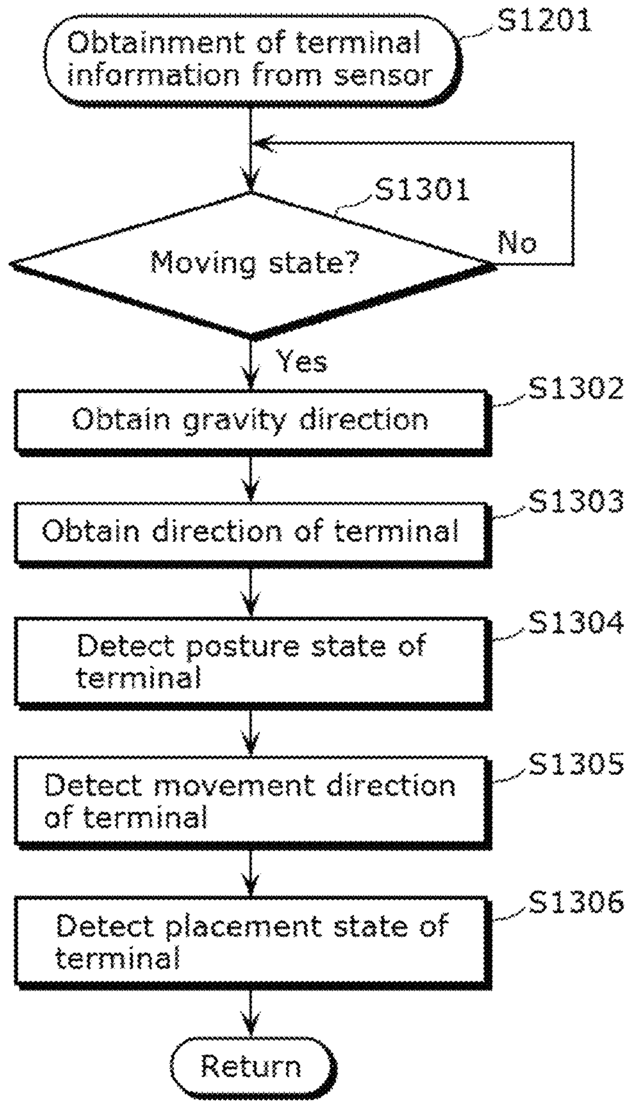

FIG. 588 is a flowchart showing an operation of the position estimation device according to Embodiment E1 of the present invention.

Figure 589:
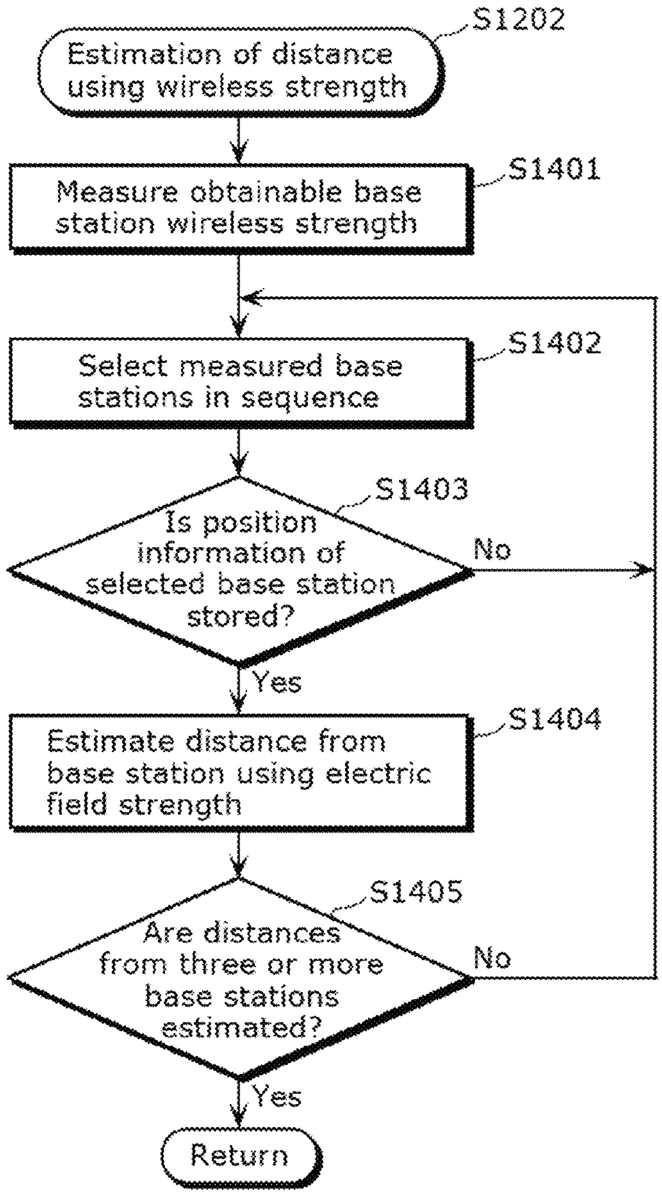

FIG. 589 is a flowchart showing an operation of the position estimation device according to Embodiment E1 of the present invention.

Figure 590:
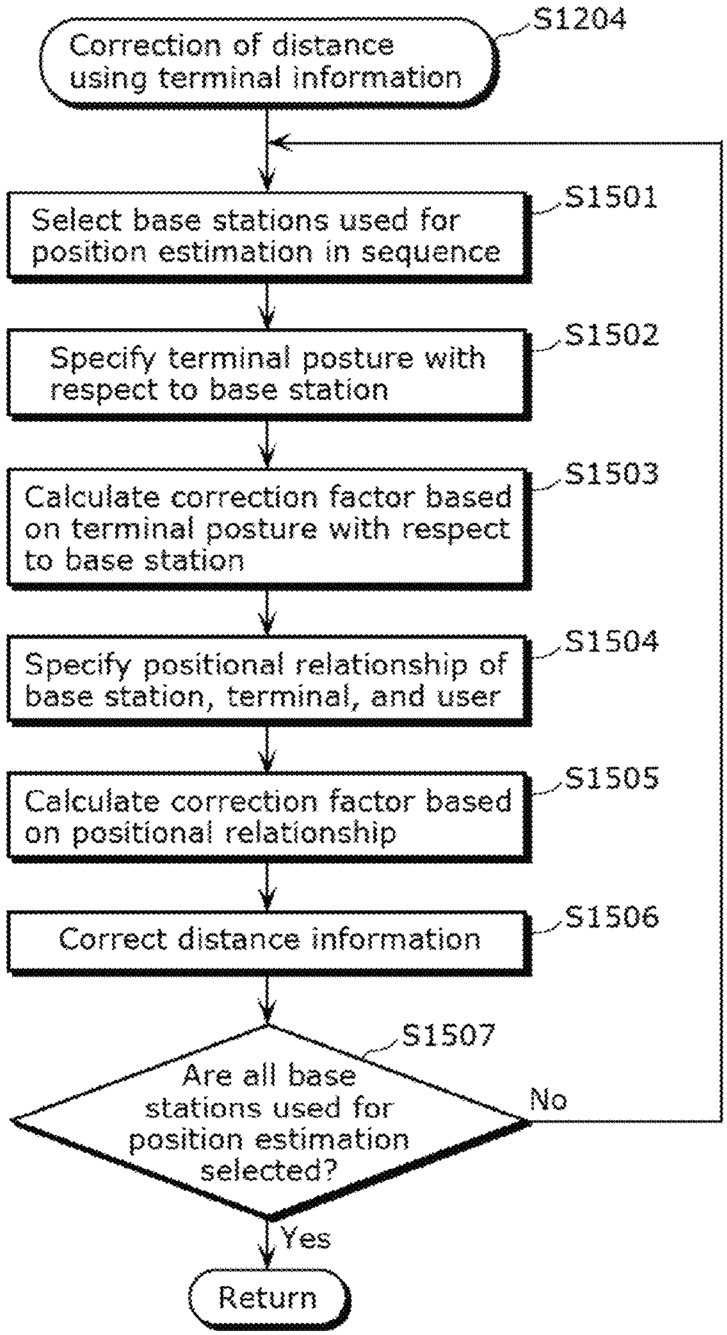

FIG. 590 is a flowchart showing an operation of the position estimation device according to Embodiment E1 of the present invention.

FIG. 591 is a diagram showing an example of a calculation result of a direction of a base station from a wireless terminal according to Embodiment E1 of the present invention.

FIG. 592 is a diagram showing an example of a determination result of whether or not a user is present between a base station and a wireless terminal according to Embodiment E1 of the present invention.

Figure 593:
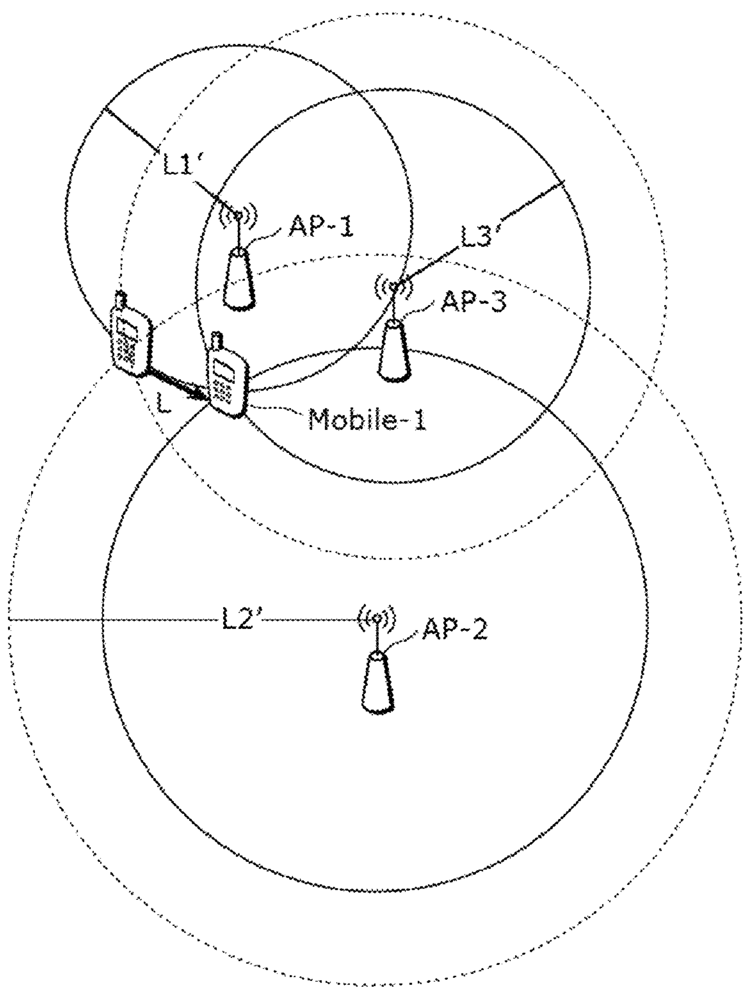

FIG. 593 is a diagram showing a result of estimating a current position using corrected distance information according to Embodiment E1 of the present invention.

Figure 594:
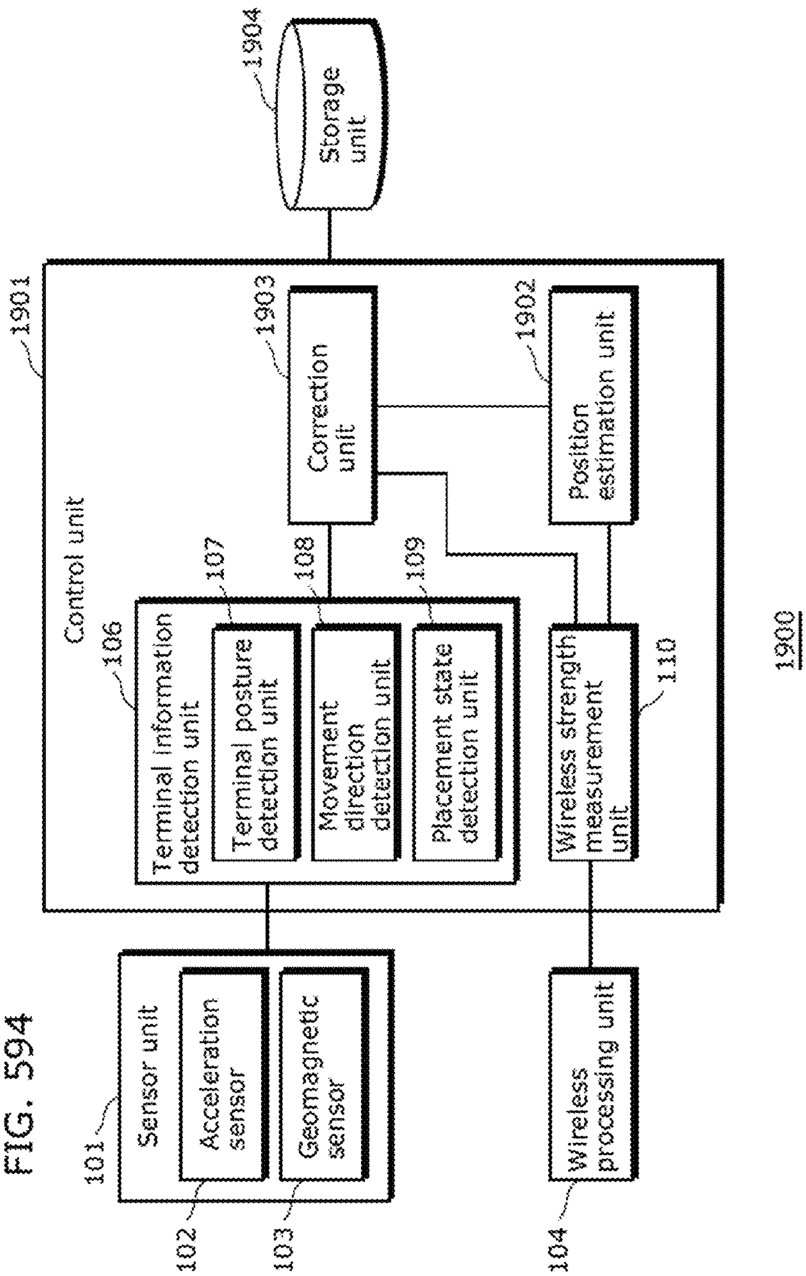

FIG. 594 is a block diagram showing a structure of a position estimation device according to Embodiment E2 of the present invention.

FIG. 595 is a diagram showing an example of an electric field strength map according to Embodiment E2 of the present invention.

Figure 596:
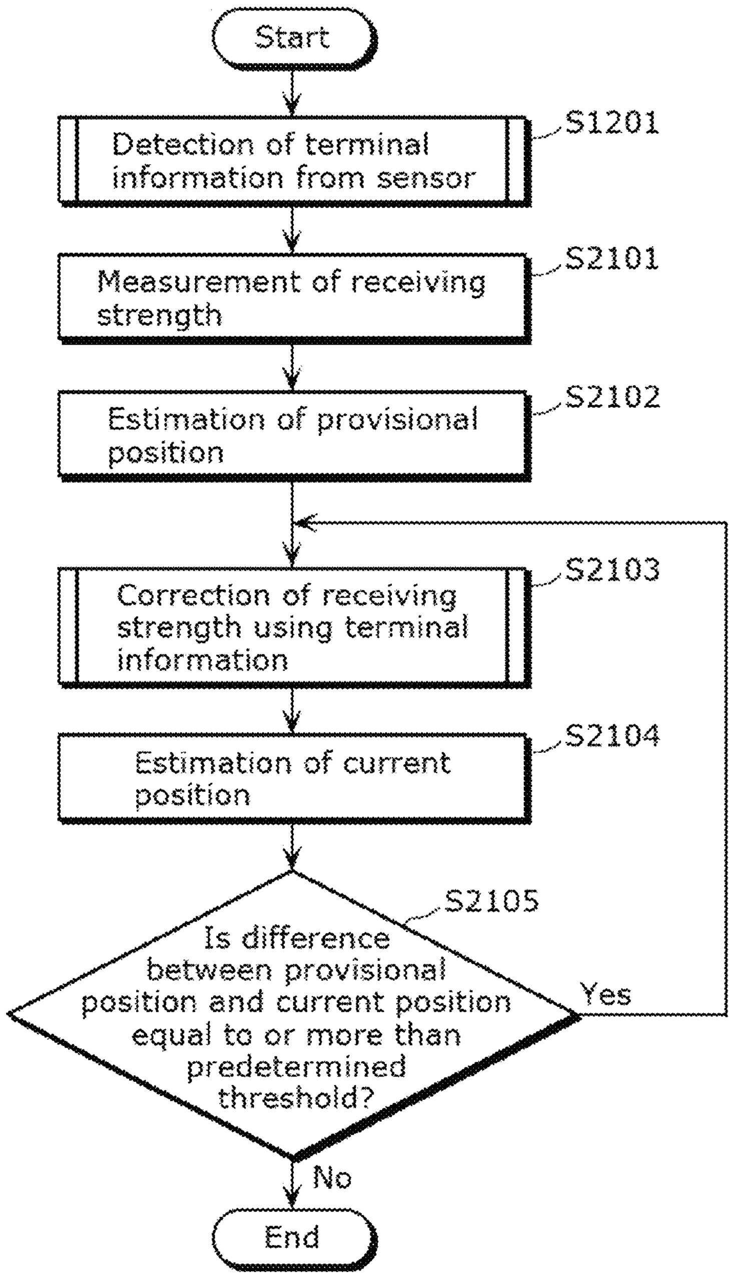

FIG. 596 is a flowchart showing an operation of the position estimation device according to Embodiment E2 of the present invention.

Figure 597:
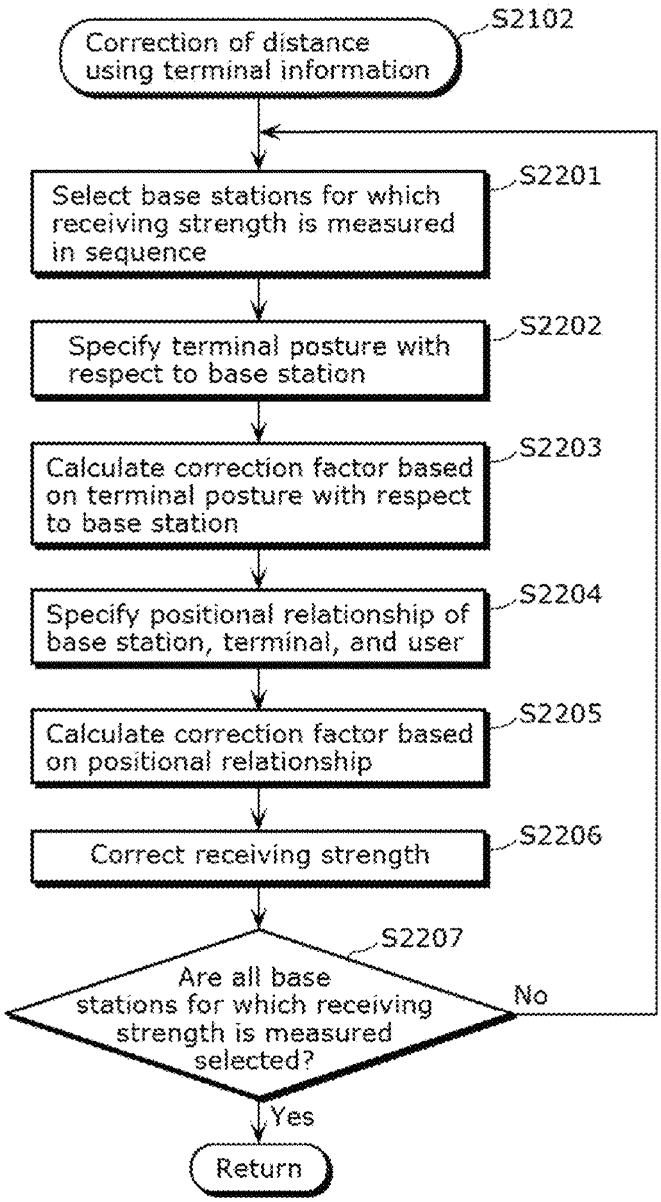

FIG. 597 is a flowchart showing an operation of the position estimation device according to Embodiment E2 of the present invention.

Figure 598:
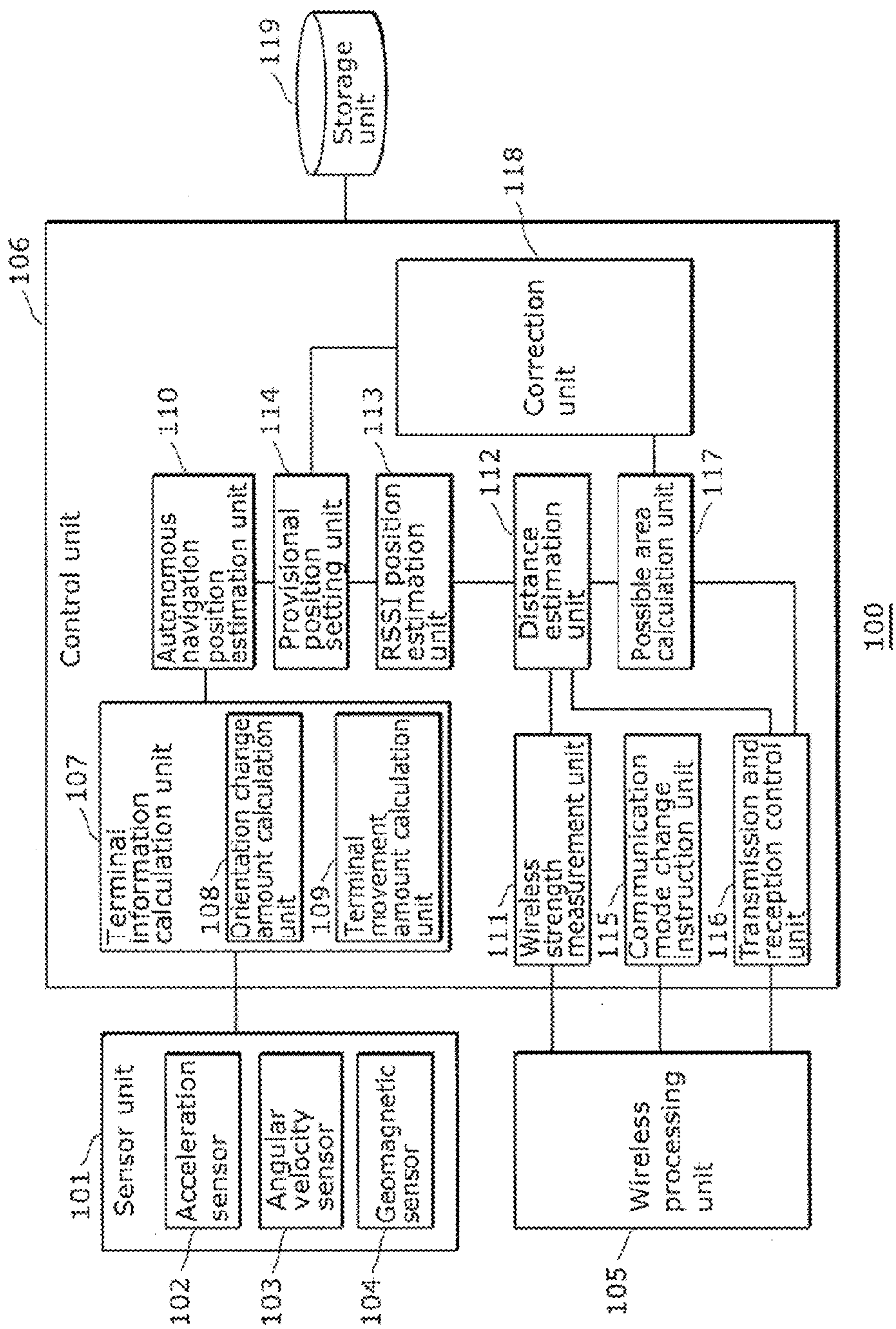

FIG. 598 is a block diagram showing a configuration of a position estimation device according to Embodiment F of the present invention.

FIG. 599 is a diagram showing an example of base station management information according to Embodiment F of the present invention.

Figure 600:
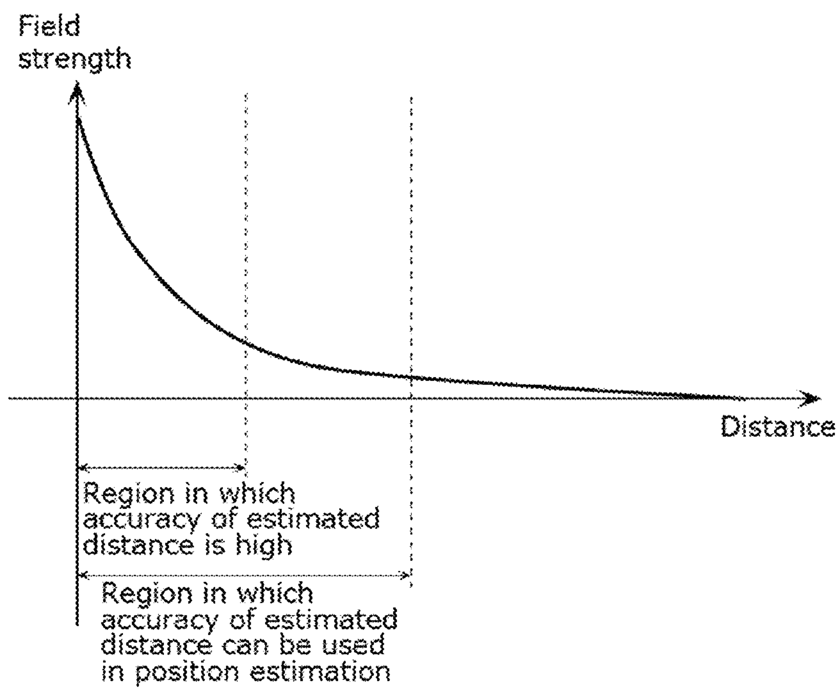

FIG. 600 is a diagram showing a relationship between receiving field strength and distance according to Embodiment F of the present invention.

FIG. 601 is a diagram showing a specific example of estimated distance information and distance accuracy information according to Embodiment F of the present invention.

Figure 602:
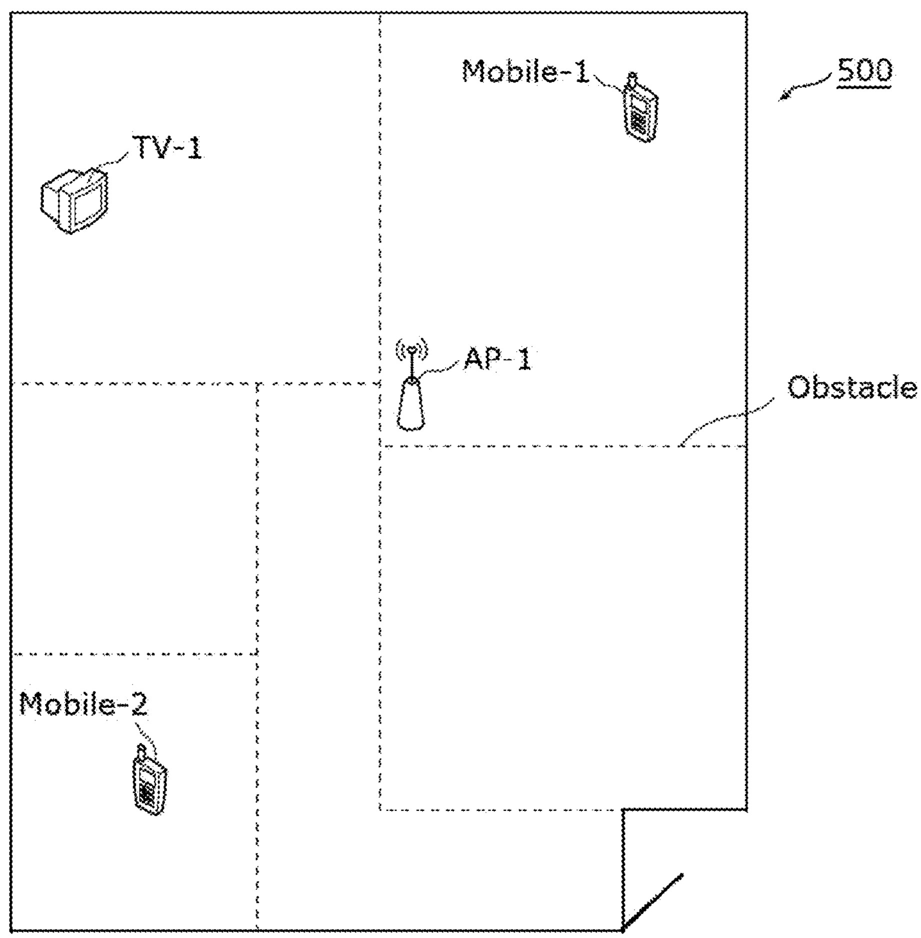

FIG. 602 is a diagram showing map information and an example of placement of wireless stations according to Embodiment F of the present invention.

FIG. 603 is a diagram showing an example of wireless station information according to Embodiment F of the present invention.

FIG. 604 is a diagram showing an example of other wireless station information according to Embodiment F of the present invention.

FIG. 605 is a diagram for describing a method of calculating a possible area according to Embodiment F of the present invention.

FIG. 606 is a diagram showing an example of association between types of obstacle and correction scaling factors according to Embodiment F of the present invention.

FIG. 607 is a diagram for describing a method of calculating a possible area according to Embodiment F of the present invention.

Figure 608:
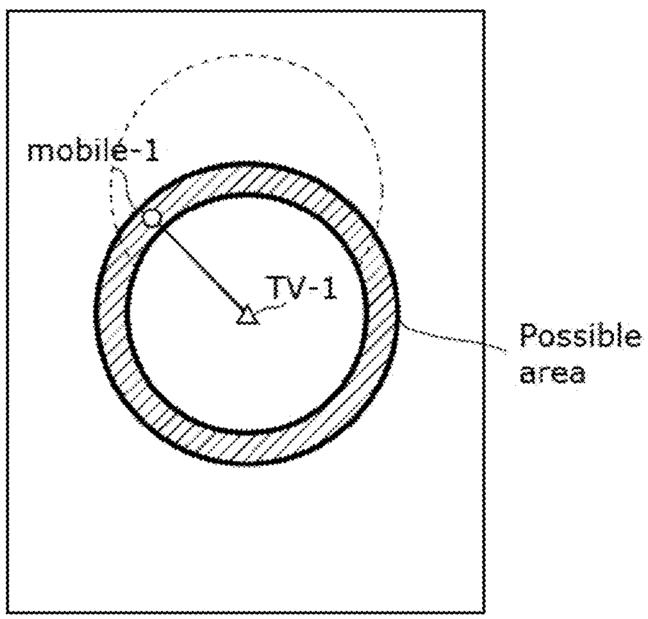

FIG. 608 is a diagram for describing a method of calculating a possible area according to Embodiment F of the present invention.

Figure 609:
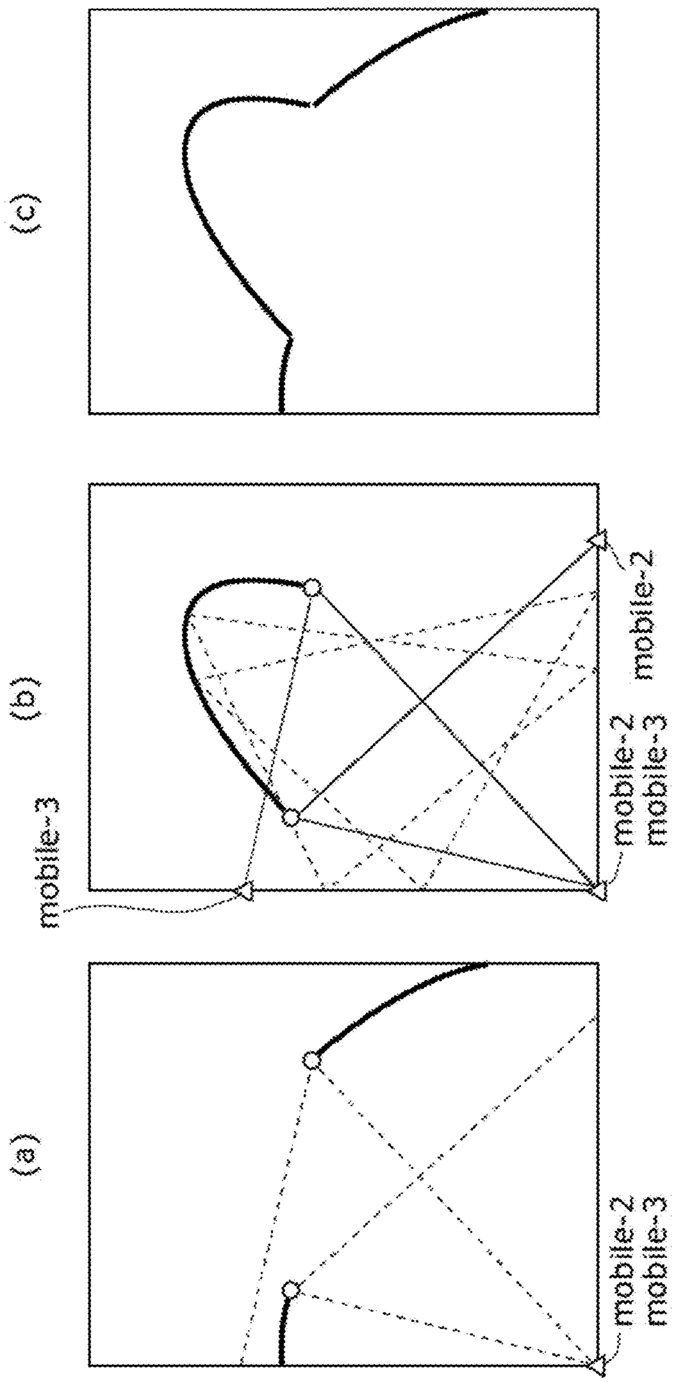

FIG. 609 is a diagram for describing a method of calculating a possible area according to Embodiment F of the present invention.

FIG. 610 is a diagram for describing a method of calculating a possible area according to Embodiment F of the present invention.

Figure 611:
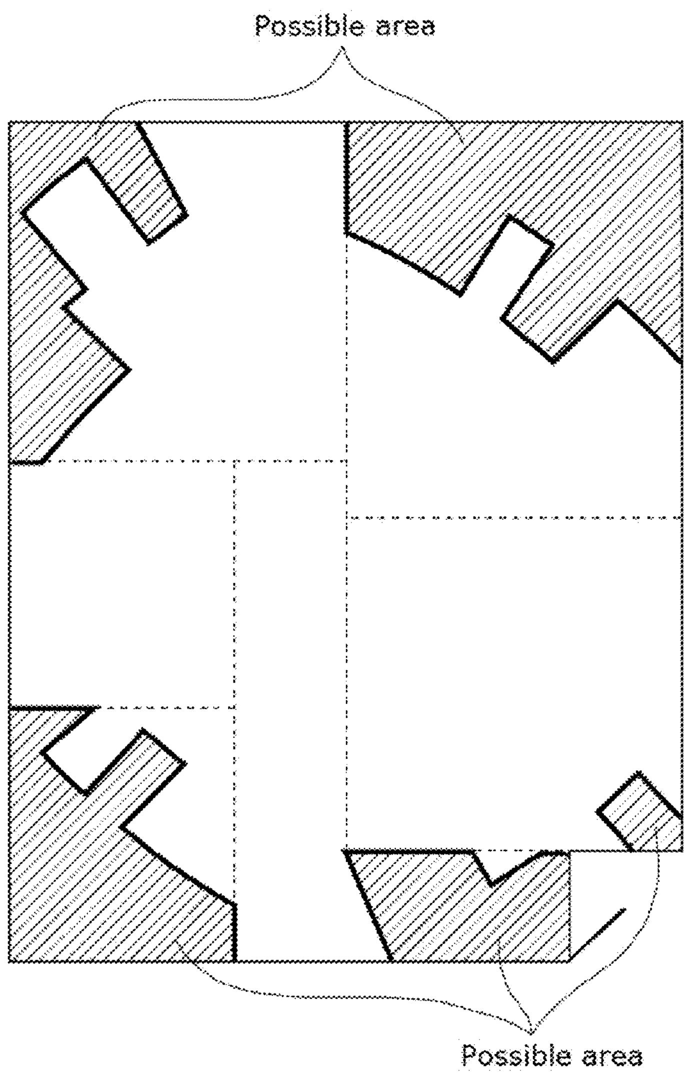

FIG. 611 is a diagram showing a specific example of a possible area calculated according to Embodiment F of the present invention.

Figure 612:
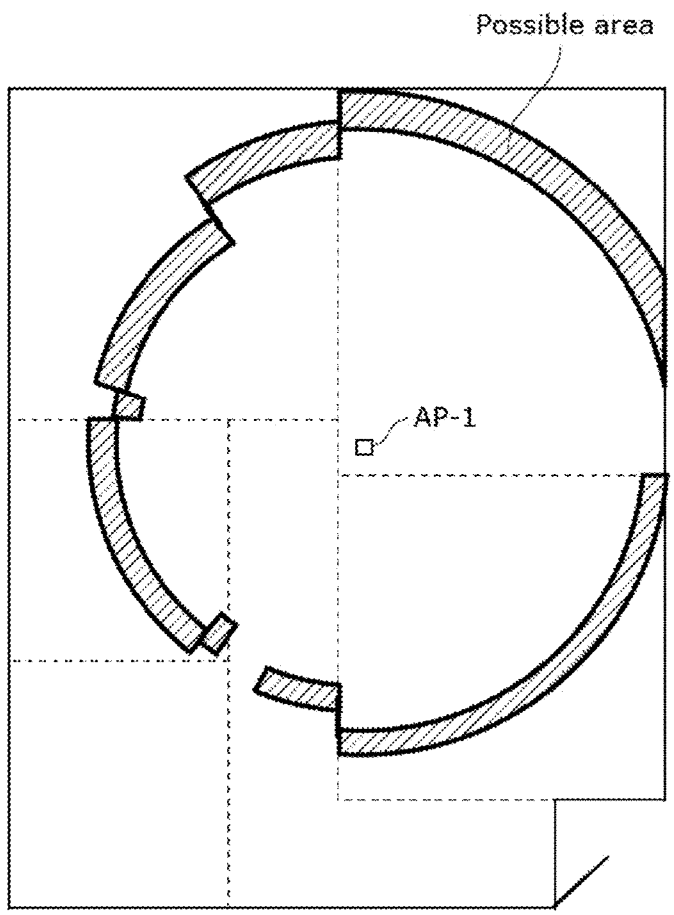

FIG. 612 is a diagram showing a specific example of a possible area calculated according to Embodiment F of the present invention.

Figure 613:
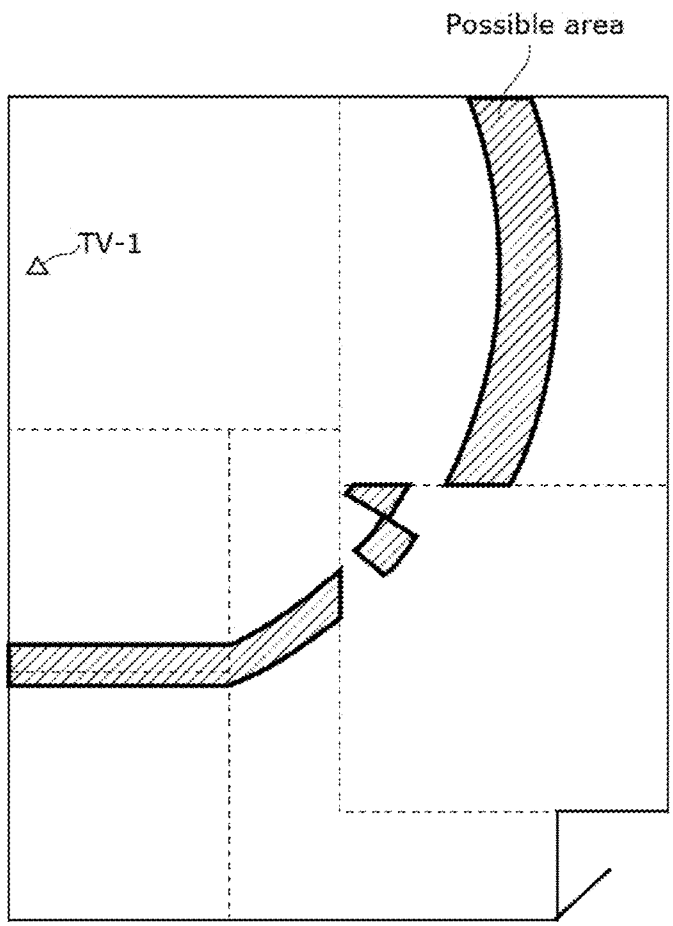

FIG. 613 is a diagram showing a specific example of a possible area calculated according to Embodiment F of the present invention.

Figure 614:
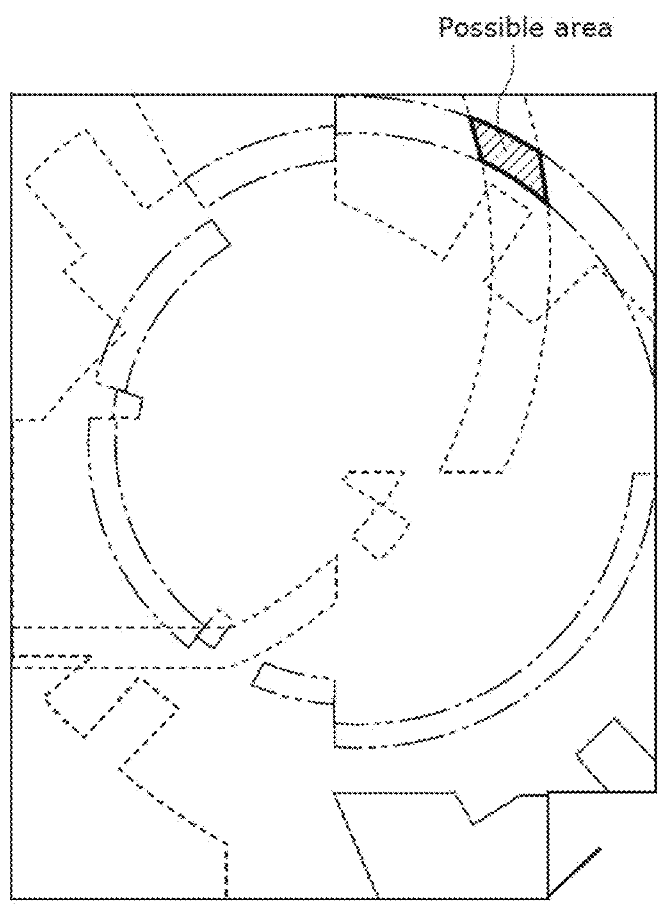

FIG. 614 is a diagram showing a specific example of a possible area calculated according to Embodiment F of the present invention.

Figure 615:
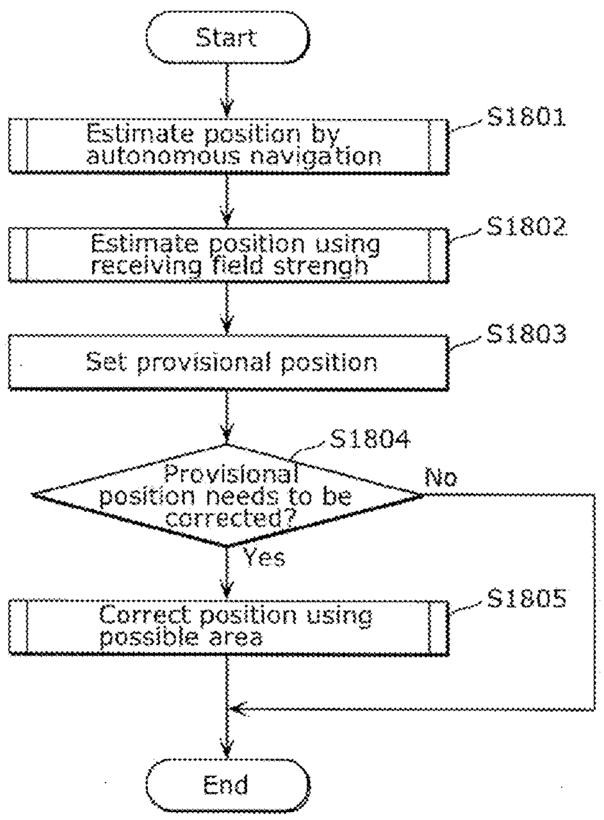

FIG. 615 is a flowchart showing operations of a position estimation device according to Embodiment F of the present invention.

Figure 616:
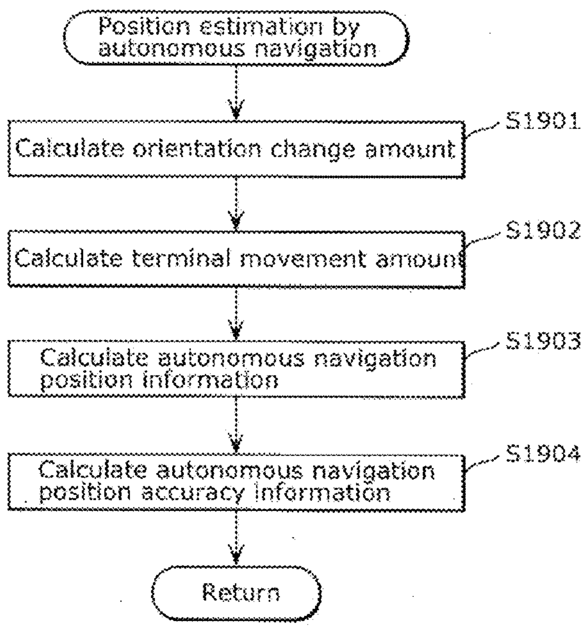

FIG. 616 is a flowchart showing operations of a position estimation device according to Embodiment F of the present invention.

Figure 617:
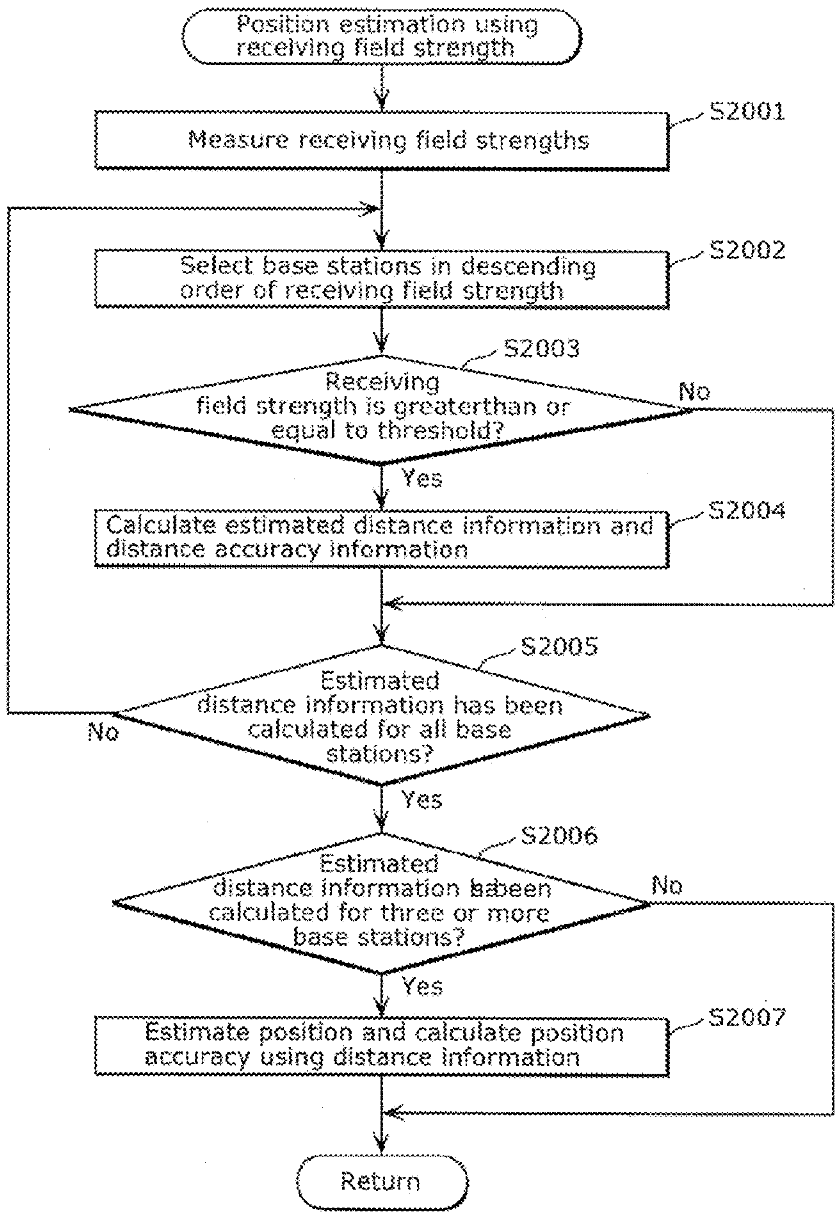

FIG. 617 is a flowchart showing operations of a position estimation device according to Embodiment F of the present invention.

Figure 618:
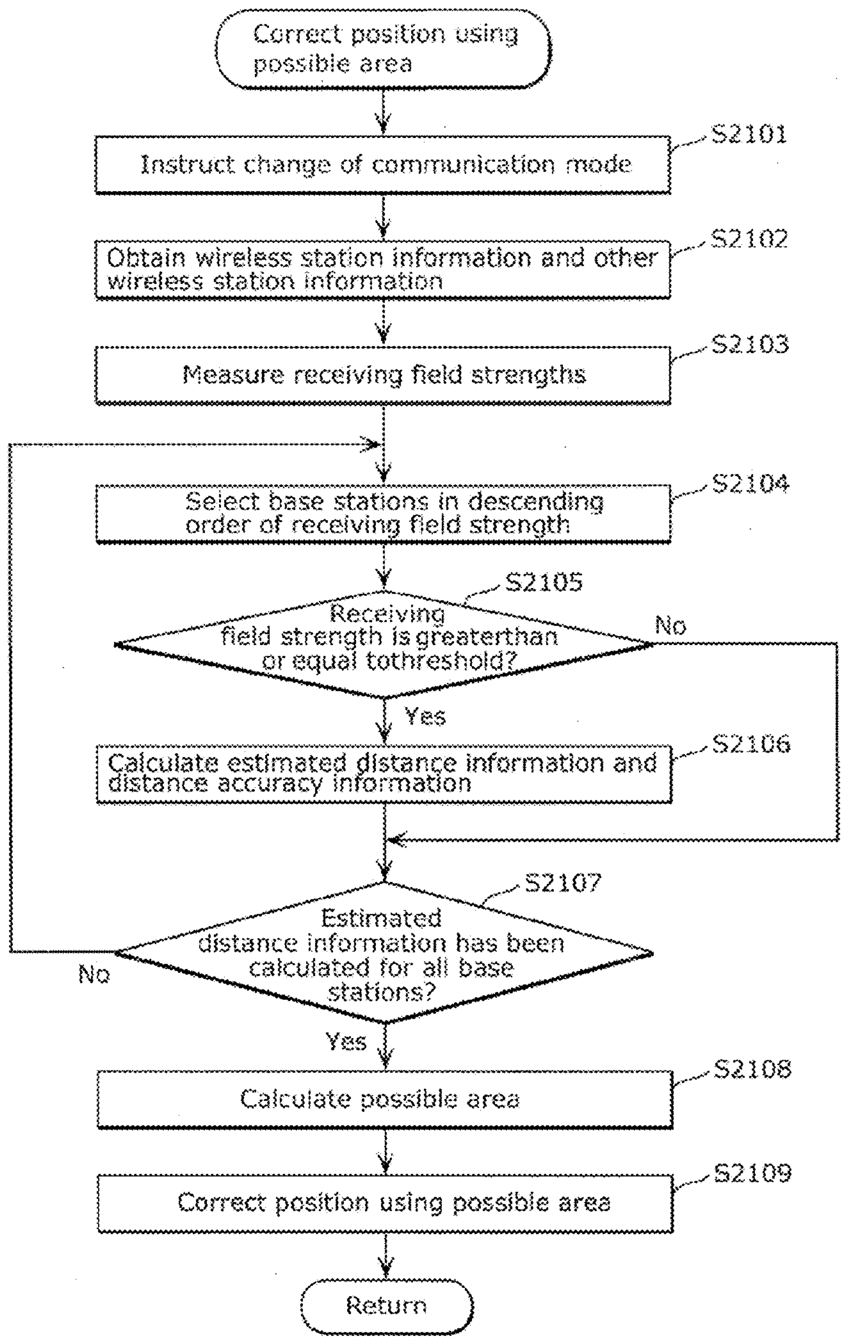

FIG. 618 is a flowchart showing operations of a position estimation device according to Embodiment F of the present invention.

Figure 619:
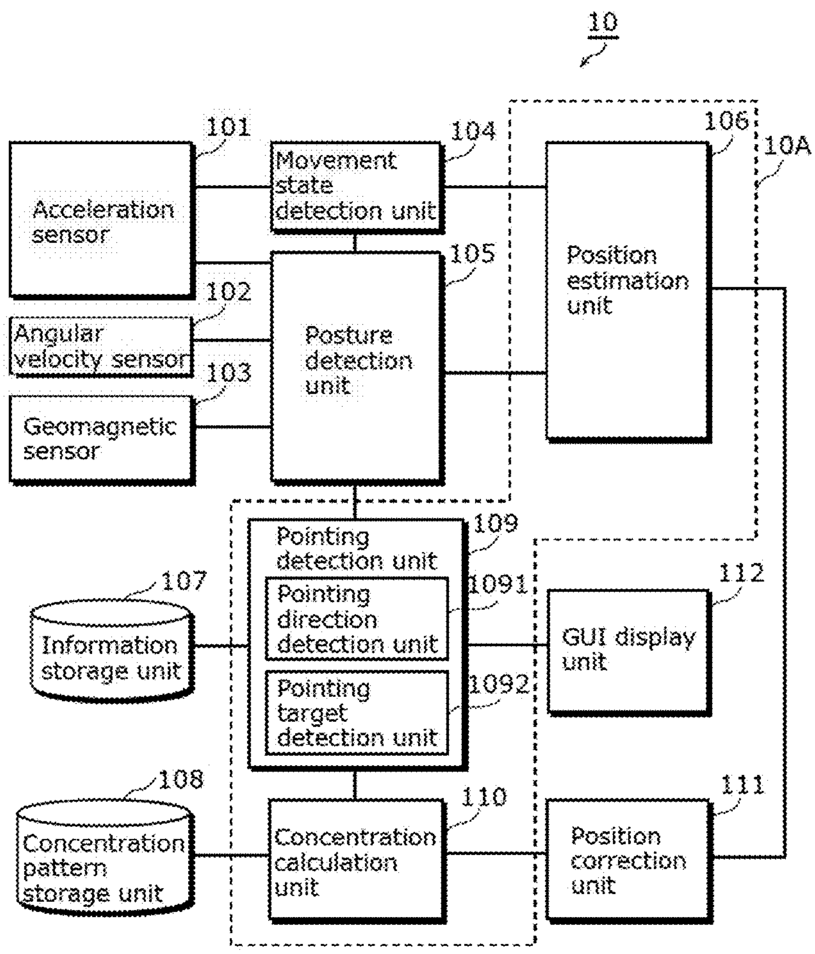

FIG. 619 is a functional block diagram of a position estimation device according to Embodiment G of the present invention.

Figure 620A:
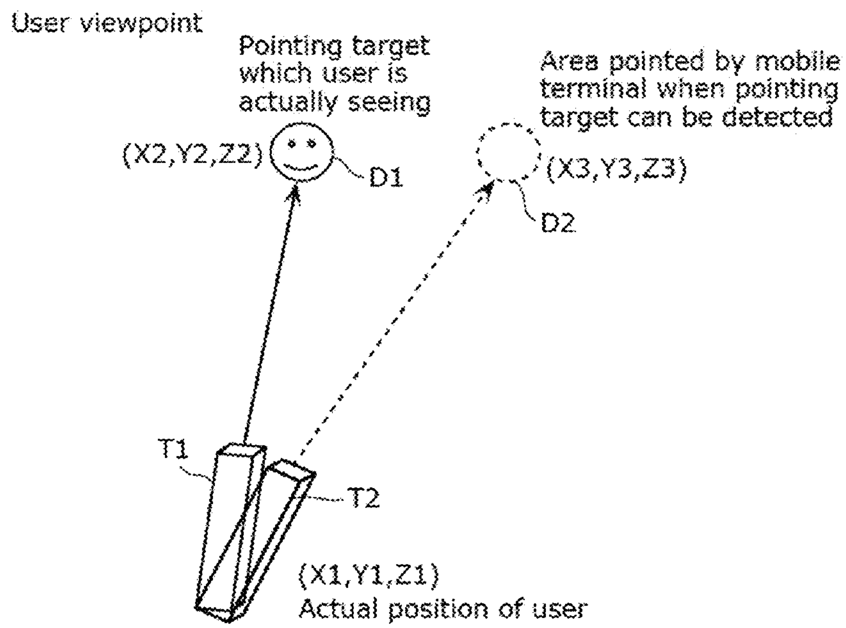

FIG. 620A is a diagram showing a difference between positional relationships recognized by a user and a mobile terminal for a pointing target according to Embodiment G of the present invention.

Figure 620B:
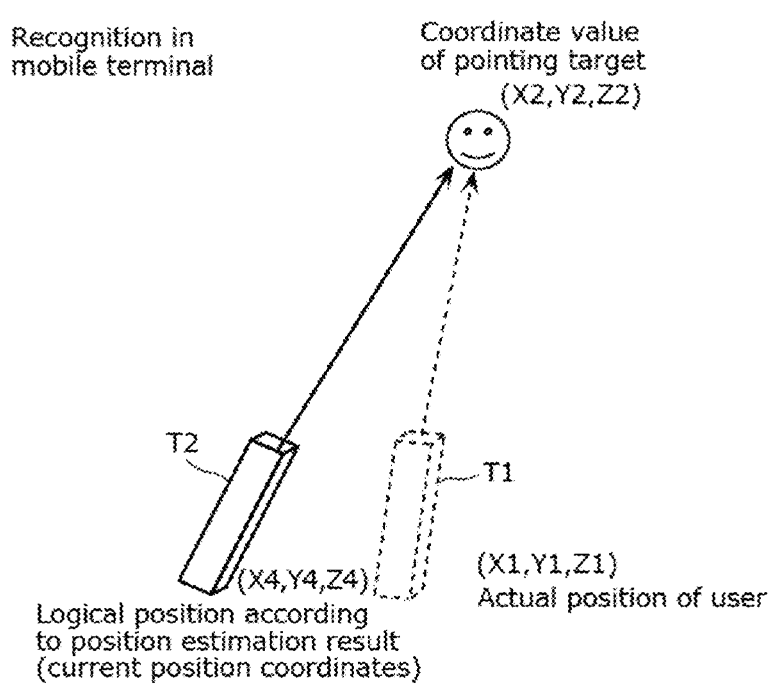

FIG. 620B is a diagram showing the difference between the positional relationships recognized by the user and the mobile terminal for the pointing target according to Embodiment G of the present invention.

Figure 621:
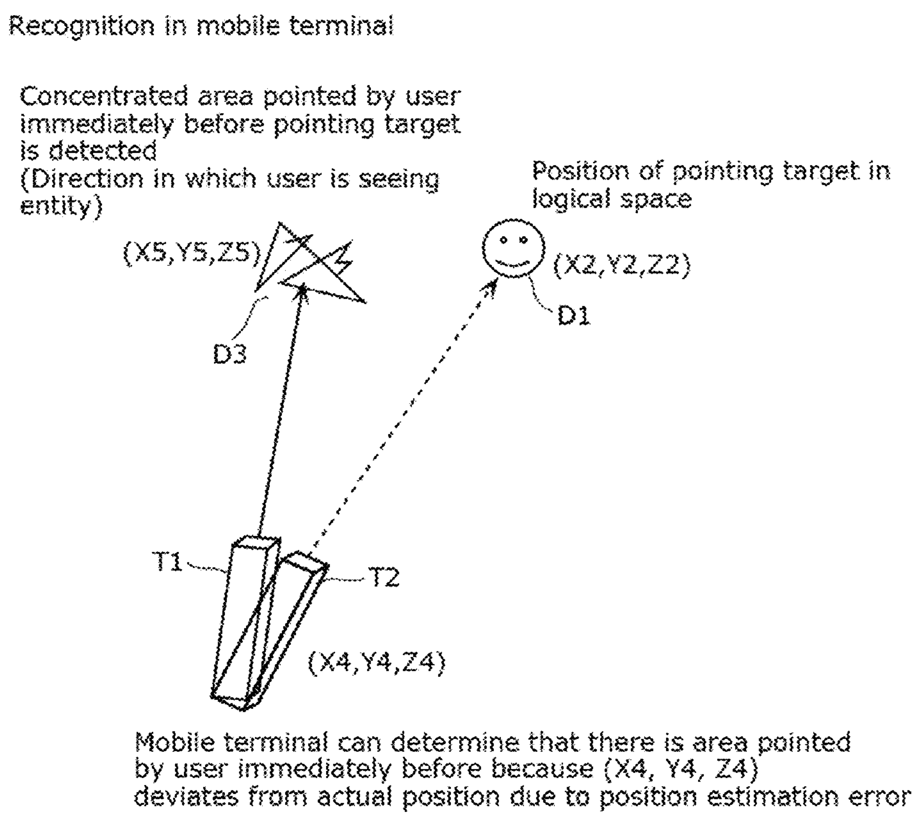

FIG. 621 is a diagram for describing an example of a method whereby the mobile terminal determines whether or not estimated position information has an error according to Embodiment G of the present invention.

Figure 622:
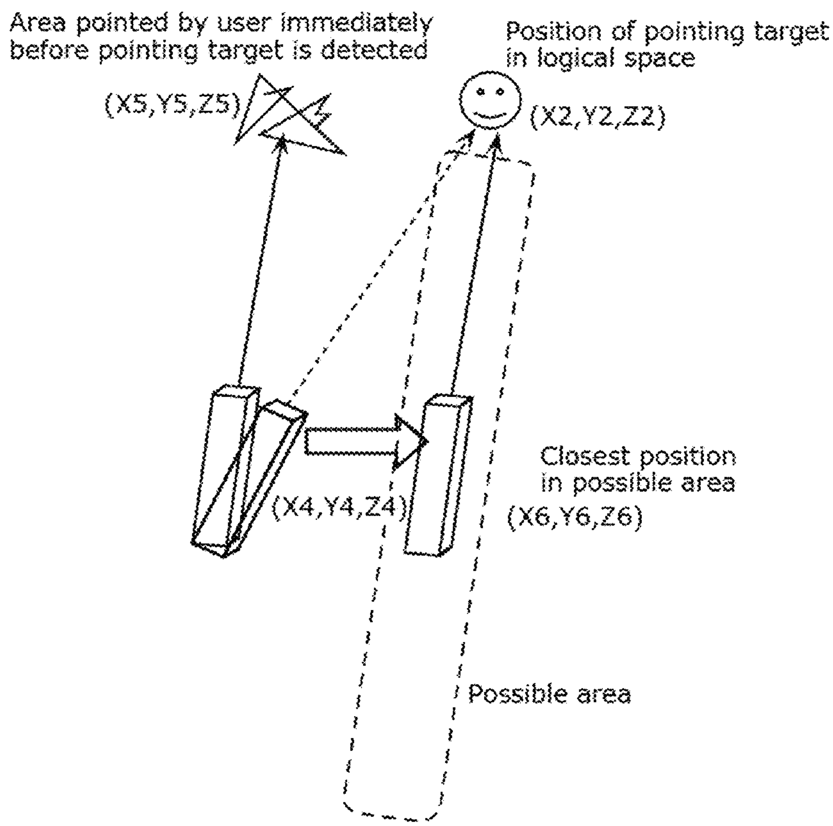

FIG. 622 is a diagram for describing an example of a method whereby, in the case of determining that estimated position information has an error, the mobile terminal corrects the position information according to Embodiment G of the present invention.

Figure 623:
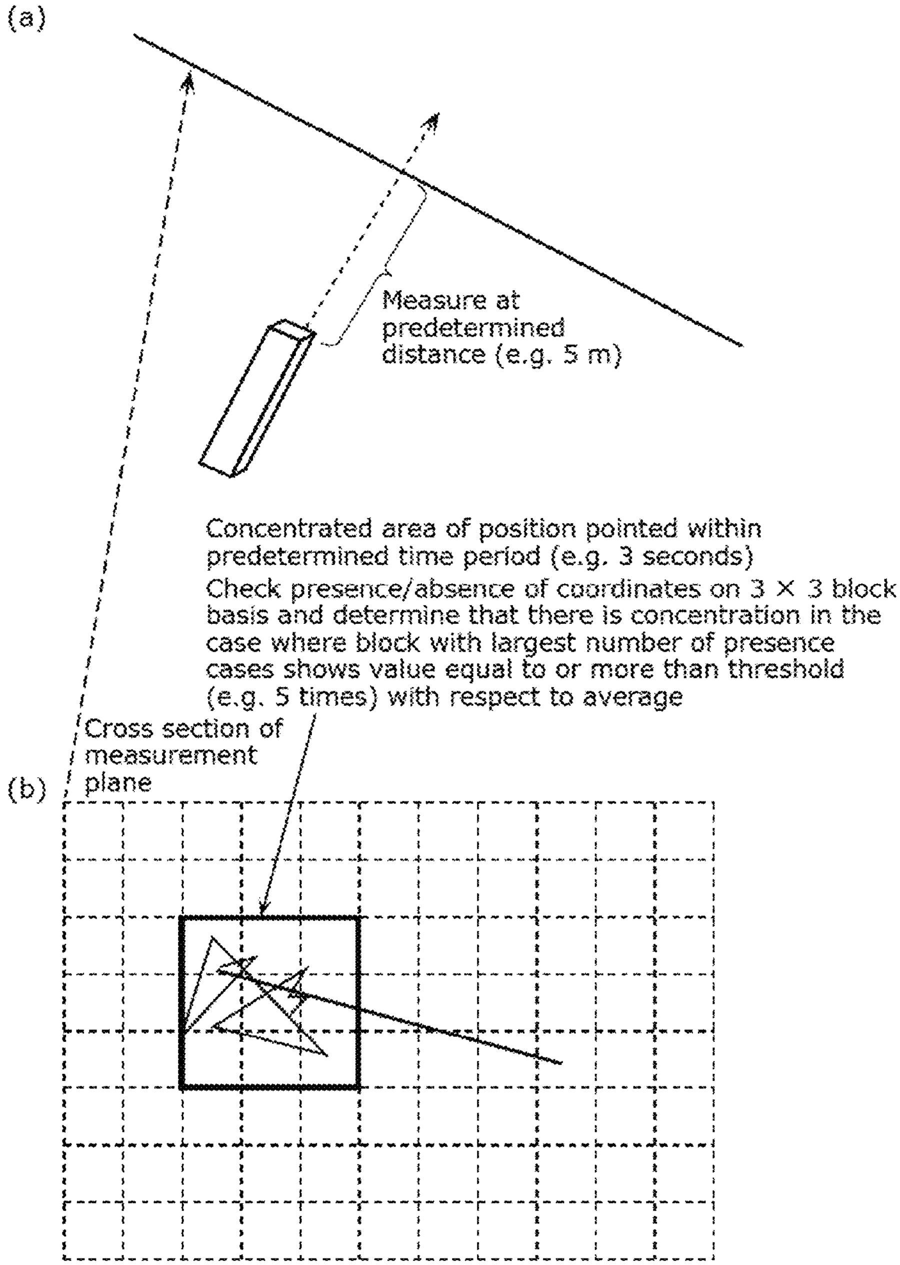

FIG. 623 is a diagram for describing an example of a method whereby the mobile terminal determines whether or not there is a concentrated area of a pointing direction according to Embodiment G of the present invention.

Figure 624A:
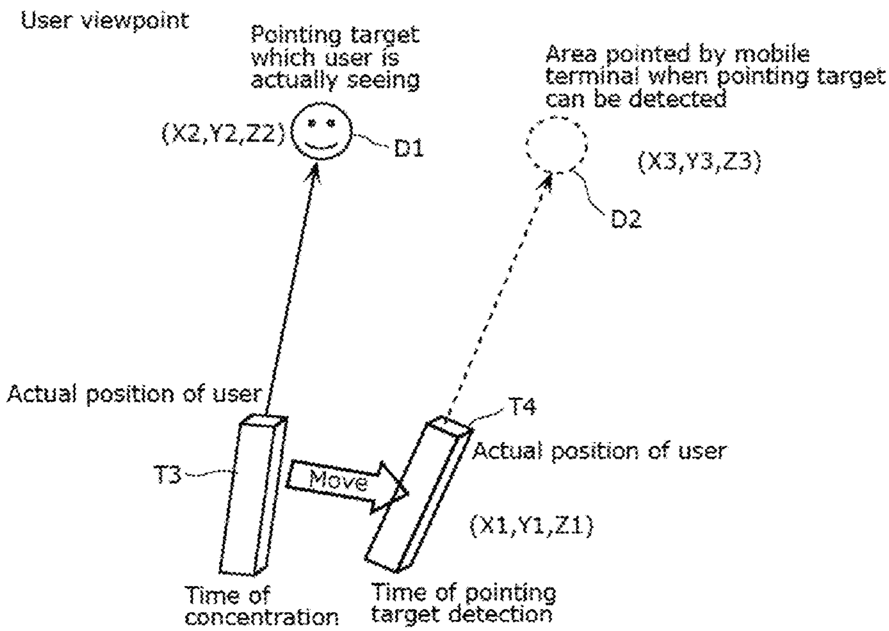

FIG. 624A is a diagram showing a difference between positional relationships recognized by the user and the mobile terminal for the pointing target according to Embodiment G of the present invention.

Figure 624B:
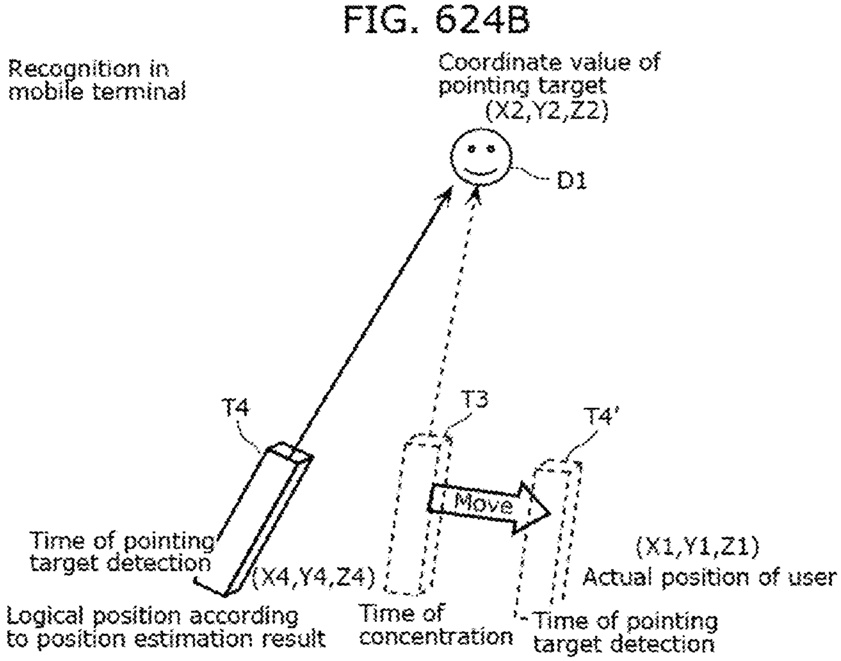

FIG. 624B is a diagram showing the difference between the positional relationships recognized by the user and the mobile terminal for the pointing target according to Embodiment G of the present invention.

Figure 625:
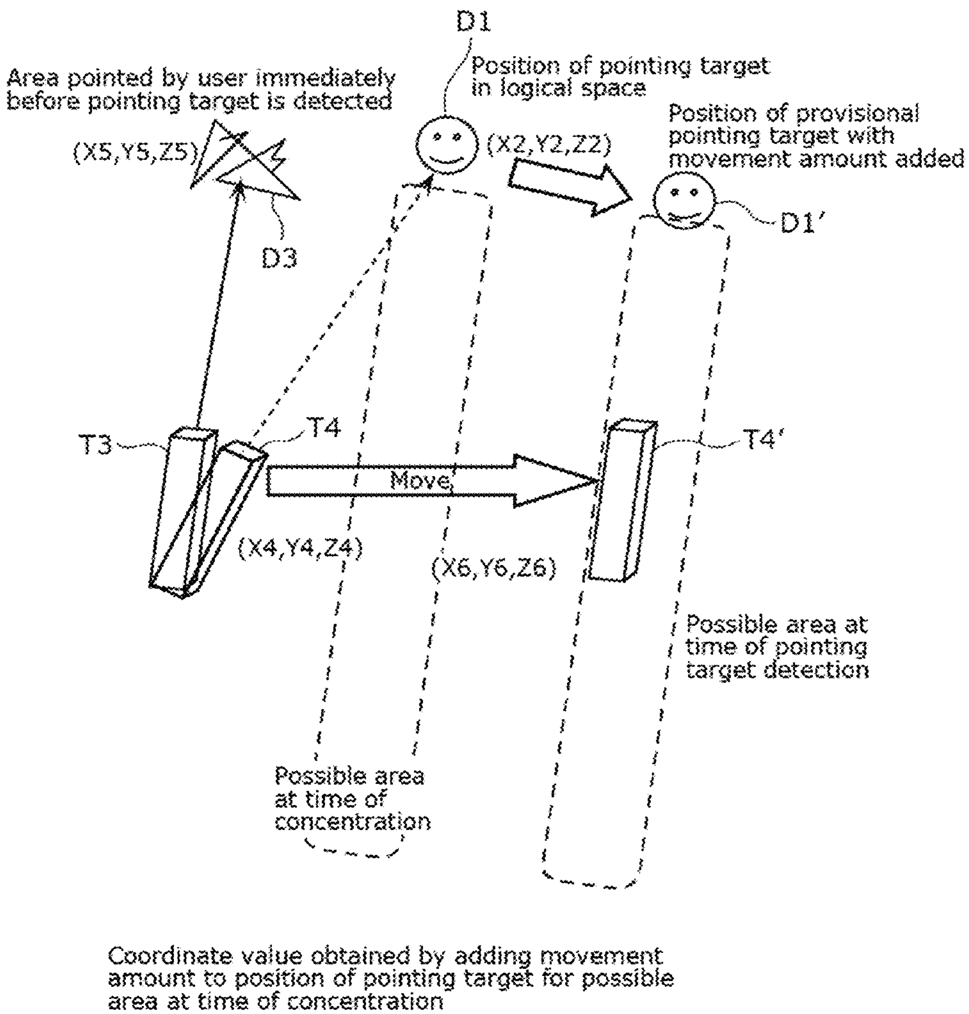

FIG. 625 is a diagram for describing an example of a method whereby, in the case of determining that estimated position information has an error, the mobile terminal corrects the position information according to Embodiment G of the present invention.

Figure 626A:
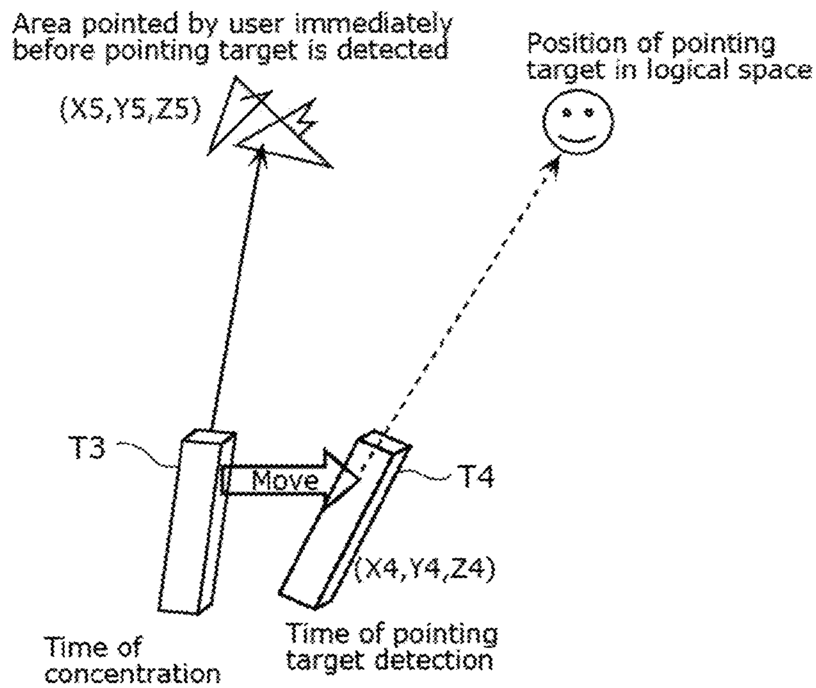

FIG. 626A is a diagram for describing an example of a method whereby, in the case of determining that estimated position information has an error, the mobile terminal corrects the position information according to Embodiment G of the present invention.

Figure 626B:
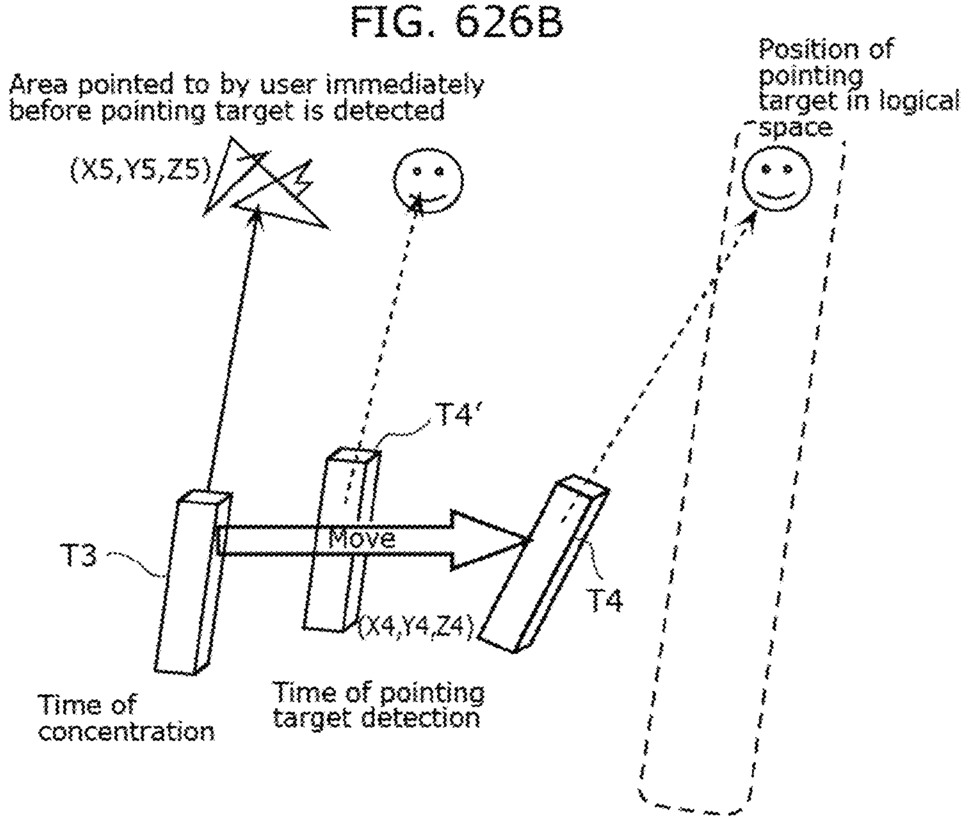

FIG. 626B is a diagram for describing an example of a method whereby, in the case where estimated position information has an error, the mobile terminal corrects the position information according to Embodiment G of the present invention.

Figure 627:
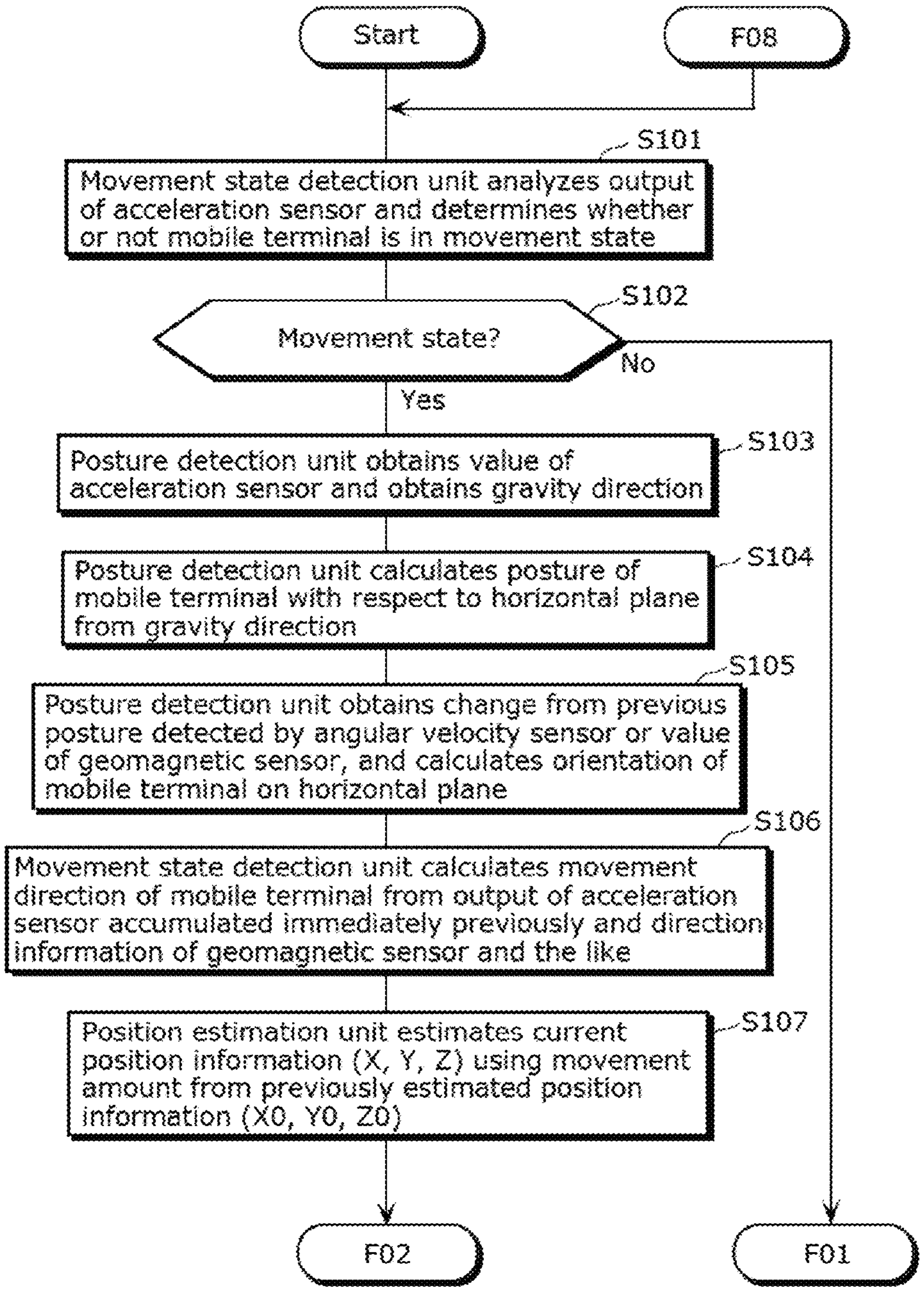

FIG. 627 is a flowchart for describing process flow of the mobile terminal according to Embodiment G of the present invention.

Figure 628:
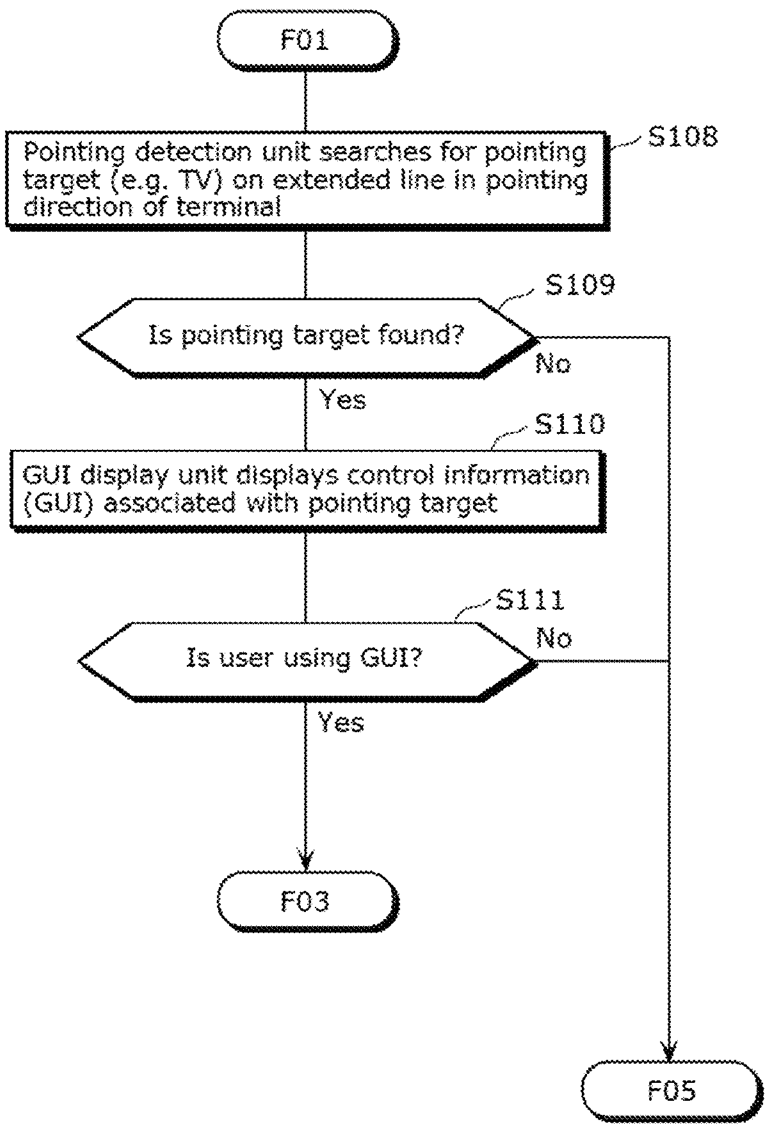

FIG. 628 is a flowchart for describing process flow of the mobile terminal according to Embodiment G of the present invention.

Figure 629:
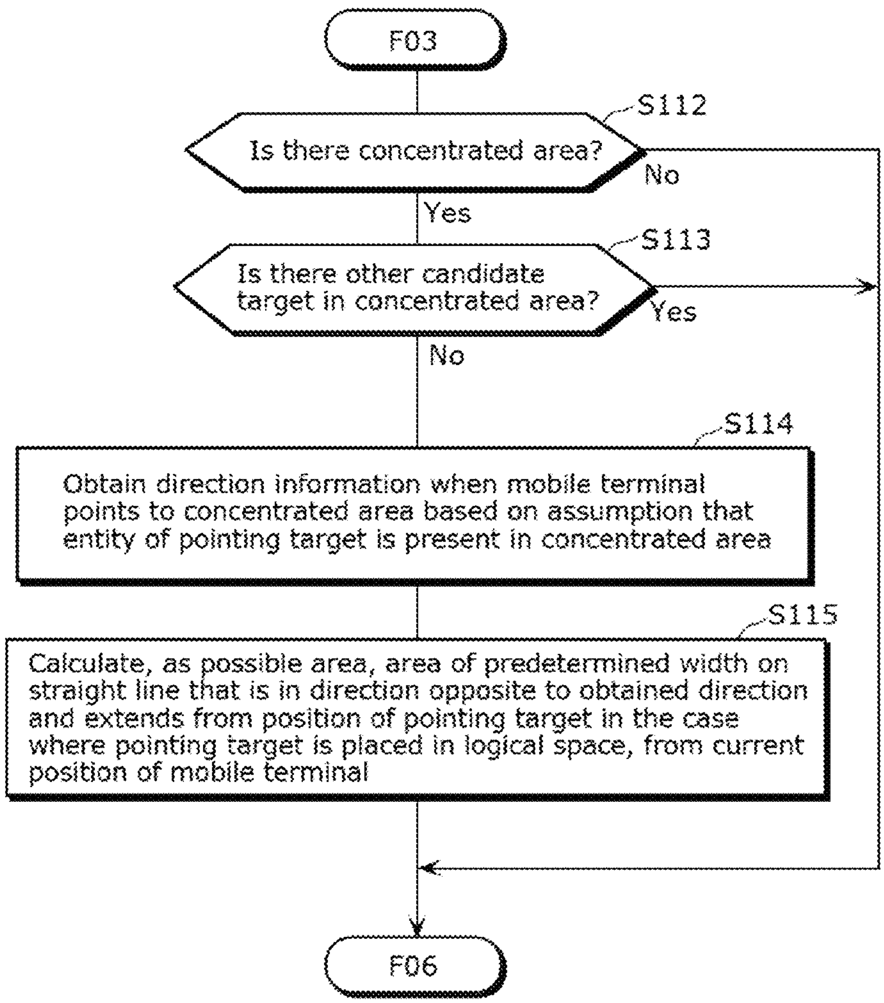

FIG. 629 is a flowchart for describing process flow of the mobile terminal according to Embodiment G of the present invention.

Figure 630:
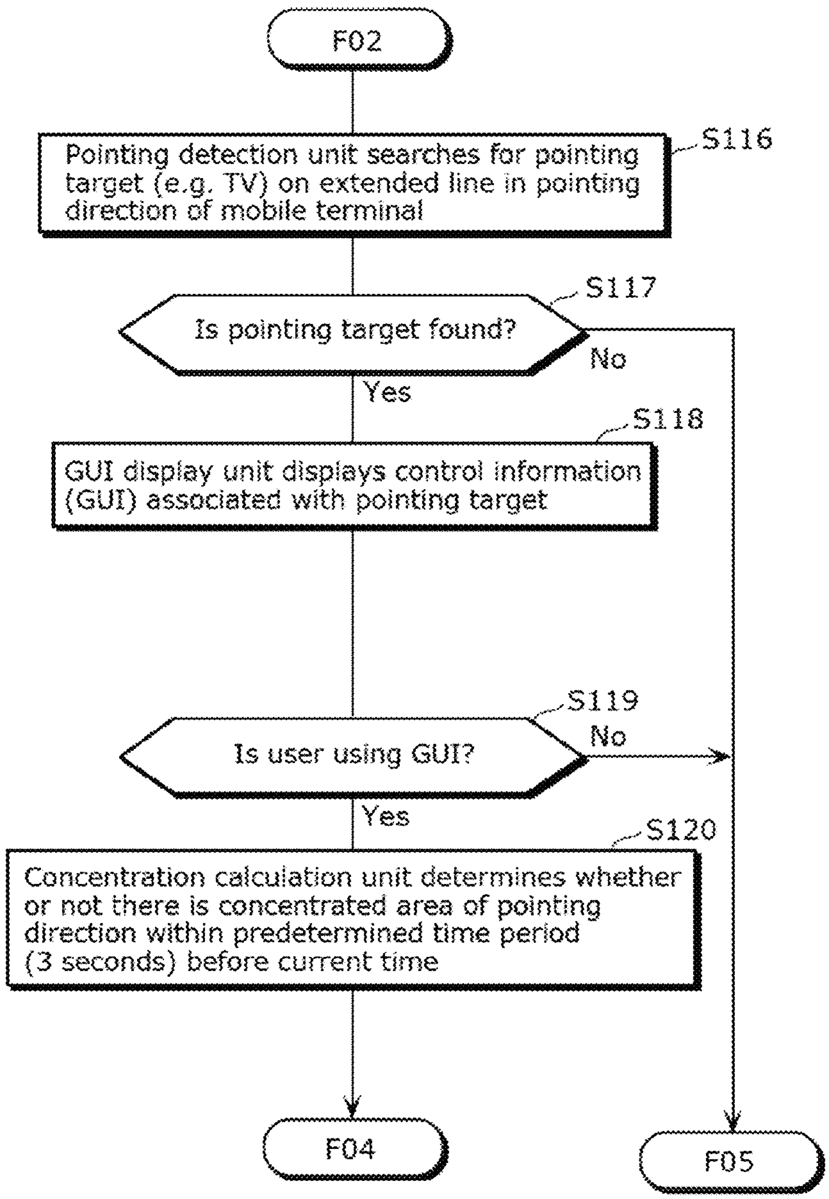

FIG. 630 is a flowchart for describing process flow of the mobile terminal according to Embodiment G of the present invention.

Figure 631:
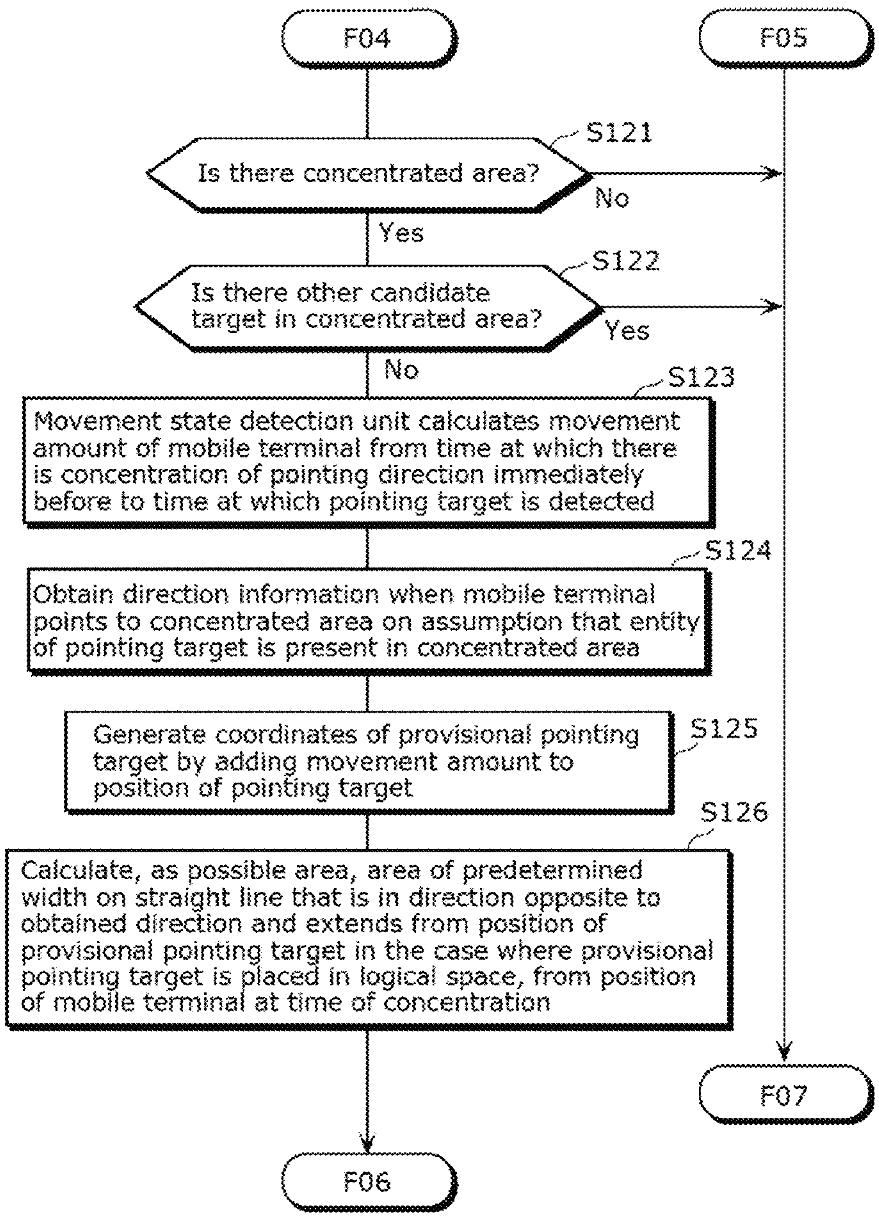

FIG. 631 is a flowchart for describing process flow of the mobile terminal according to Embodiment G of the present invention.

Figure 632:
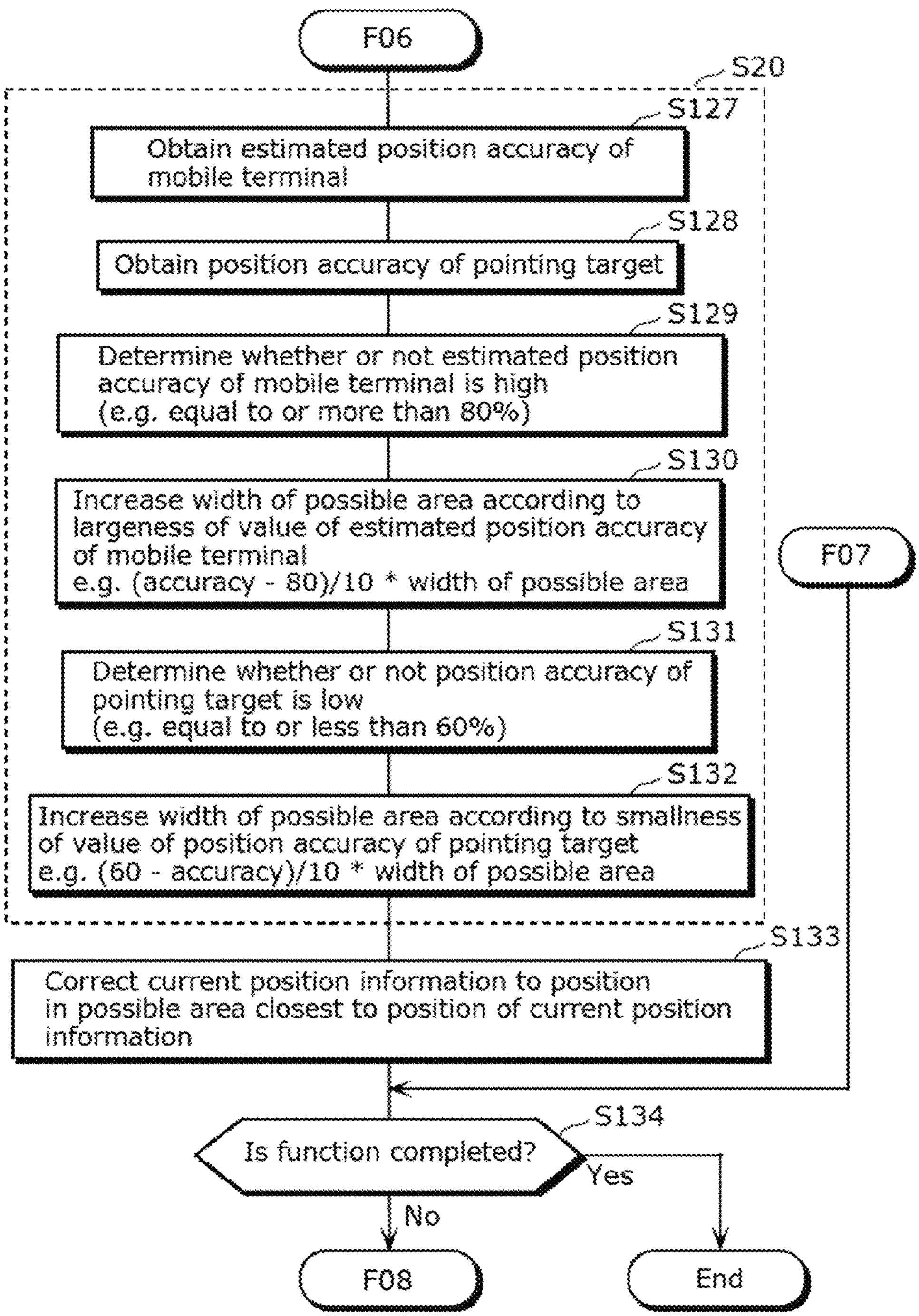

FIG. 632 is a flowchart for describing process flow of the mobile terminal according to Embodiment G of the present invention.

Figure 633:
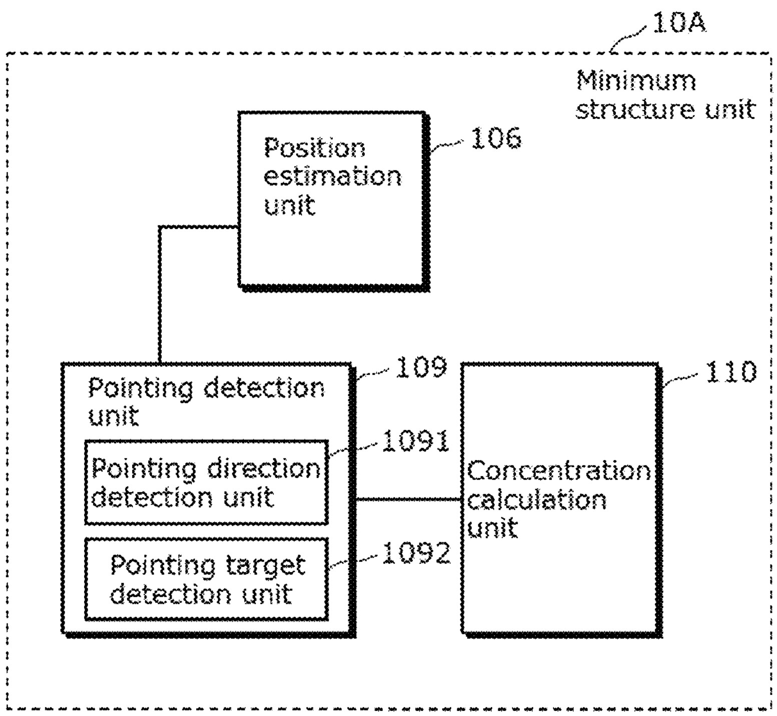

FIG. 633 is a functional block diagram showing a minimum structure of a position estimation device according to the present invention.

Figure 634:
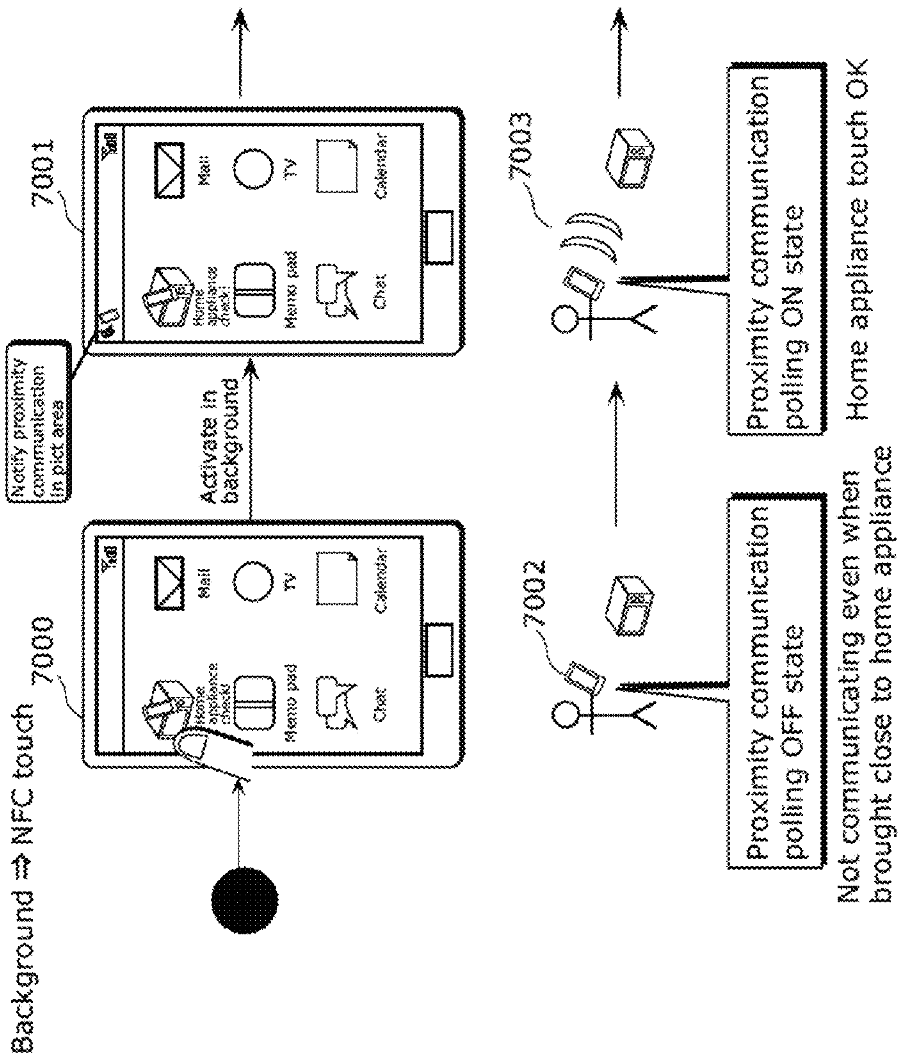

FIG. 634 is a screen transition diagram for describing home appliance touch operations using a mobile terminal according to Embodiment H of the present invention.

Figure 635:
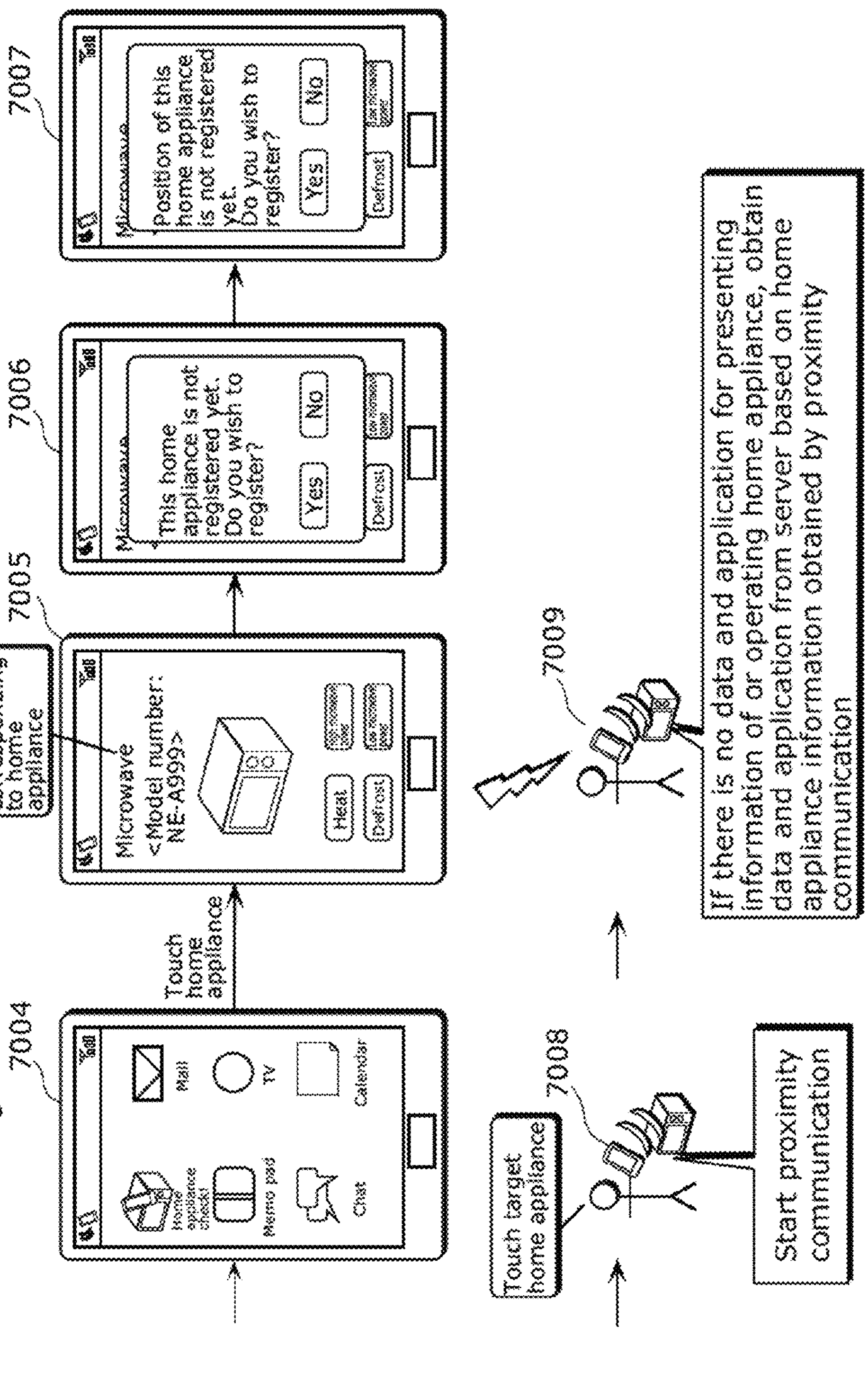

FIG. 635 is a screen transition diagram for describing home appliance touch operations using the mobile terminal according to Embodiment H of the present invention.

Figure 636:
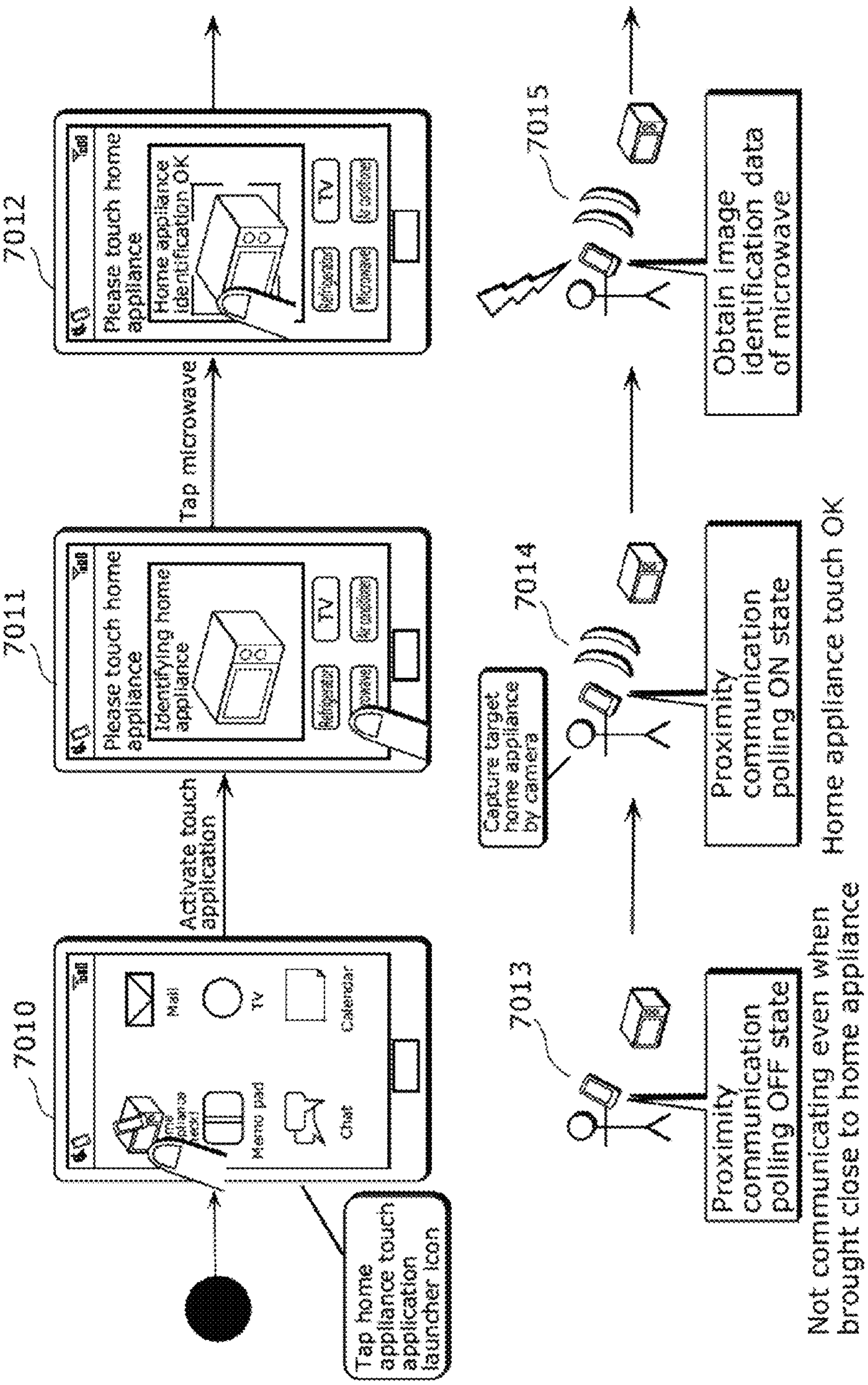

FIG. 636 is a screen transition diagram for describing home appliance touch operations using the mobile terminal according to Embodiment H of the present invention.

Figure 637:
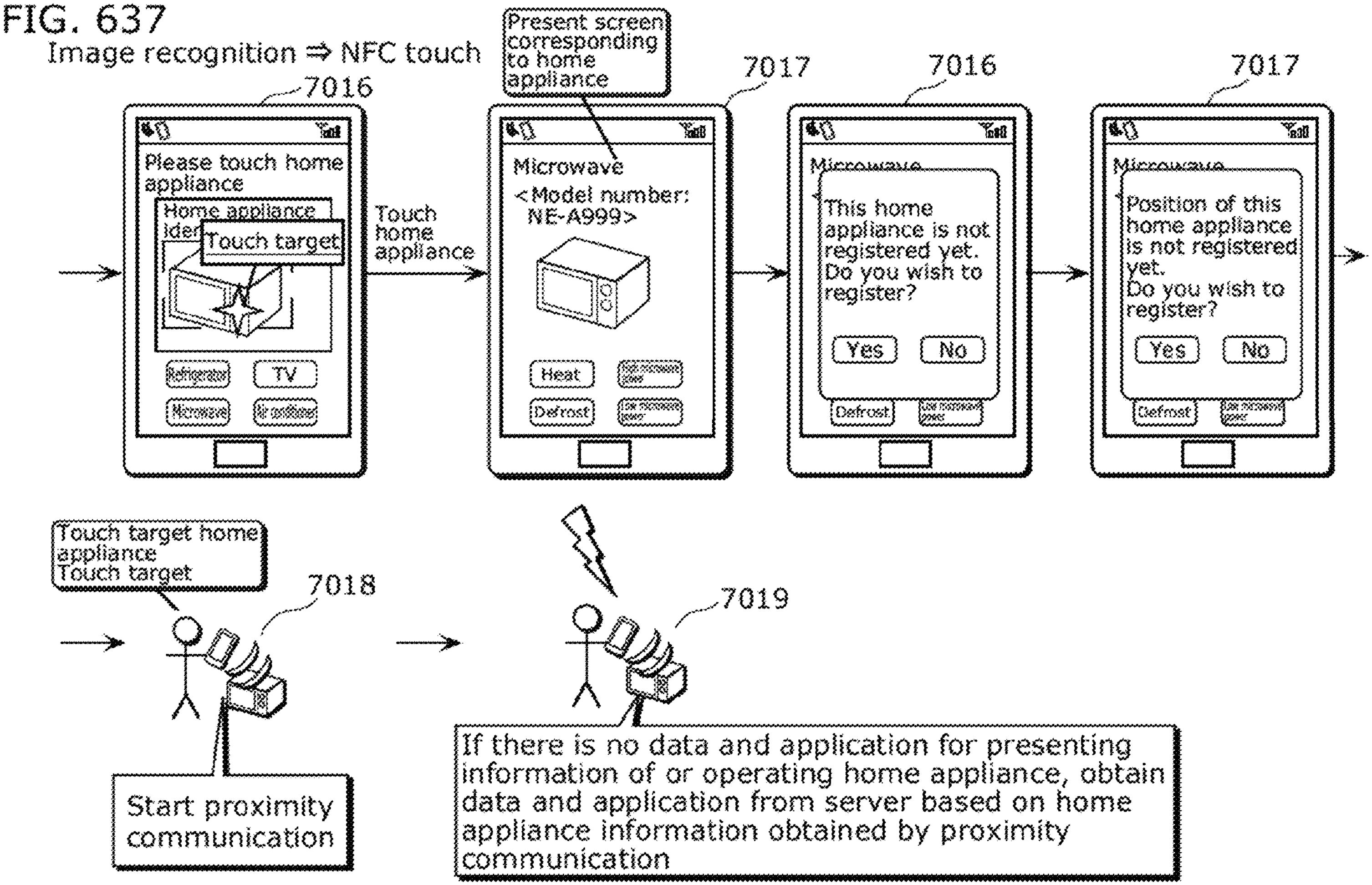

FIG. 637 is a screen transition diagram for describing home appliance touch operations using the mobile terminal according to Embodiment H of the present invention.

Figure 638:
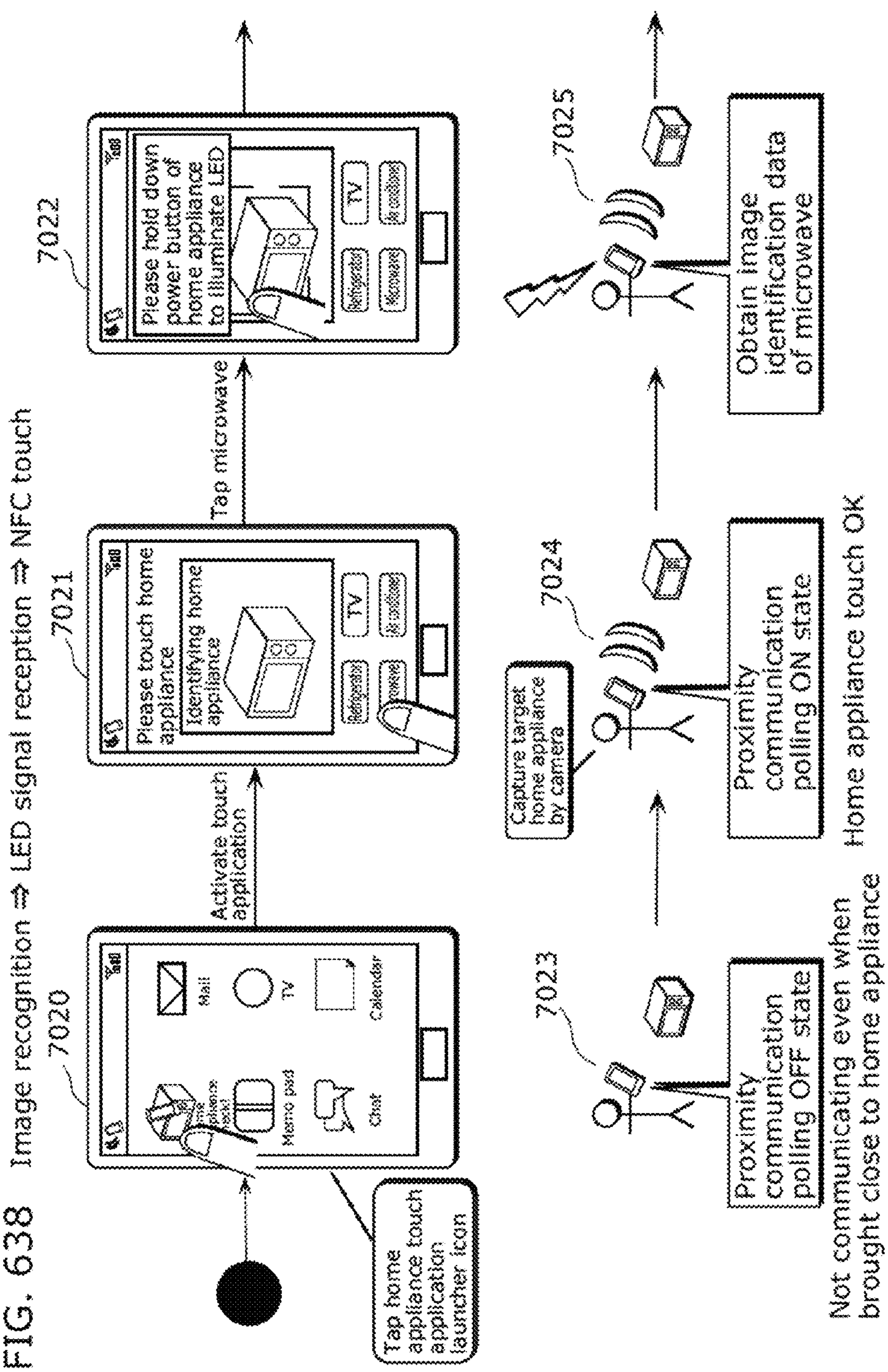

FIG. 638 is a screen transition diagram for describing home appliance touch operations using the mobile terminal according to Embodiment H of the present invention.

Figure 639:
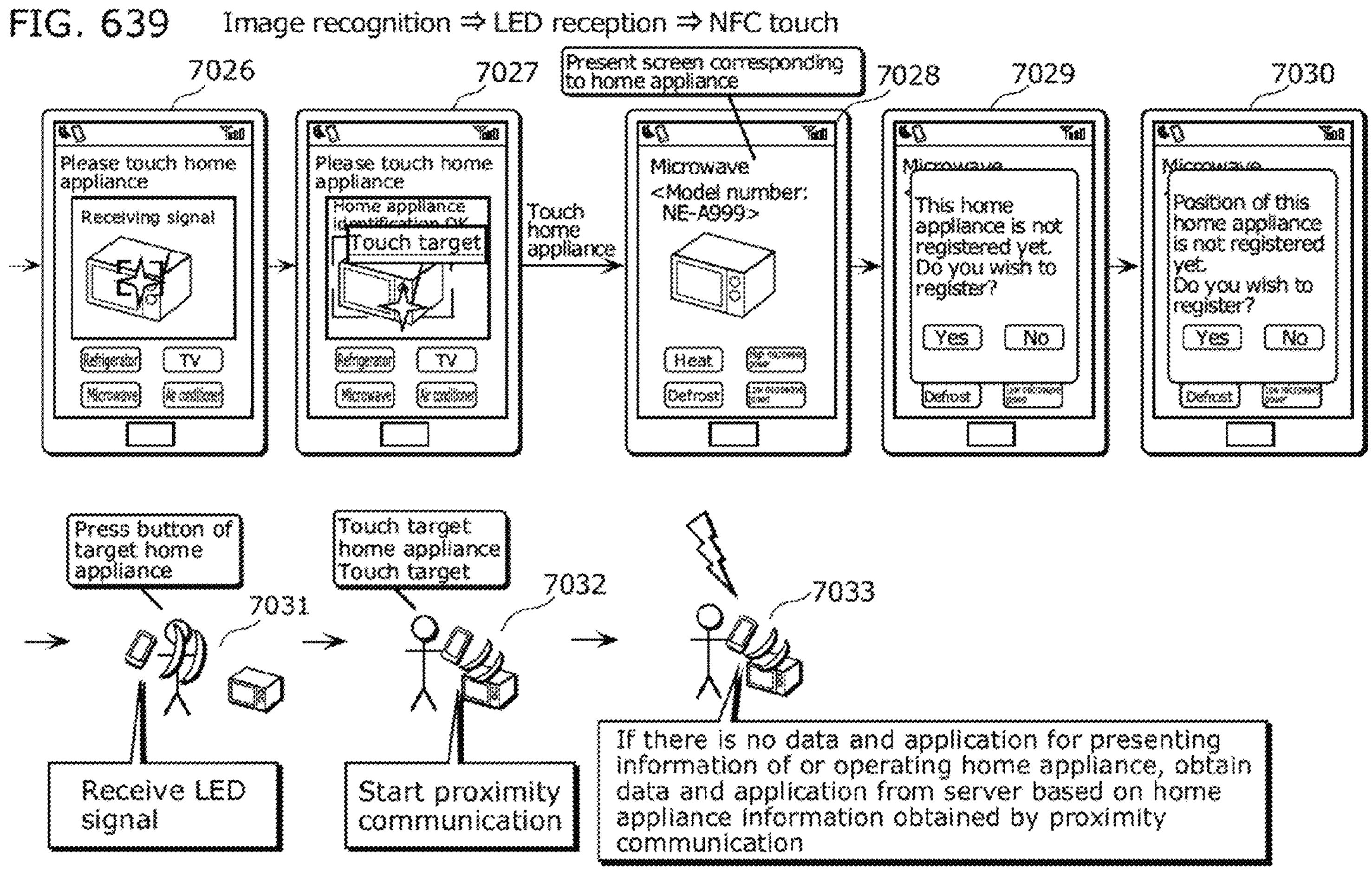

FIG. 639 is a screen transition diagram for describing home appliance touch operations using the mobile terminal according to Embodiment H of the present invention.

Figure 640:
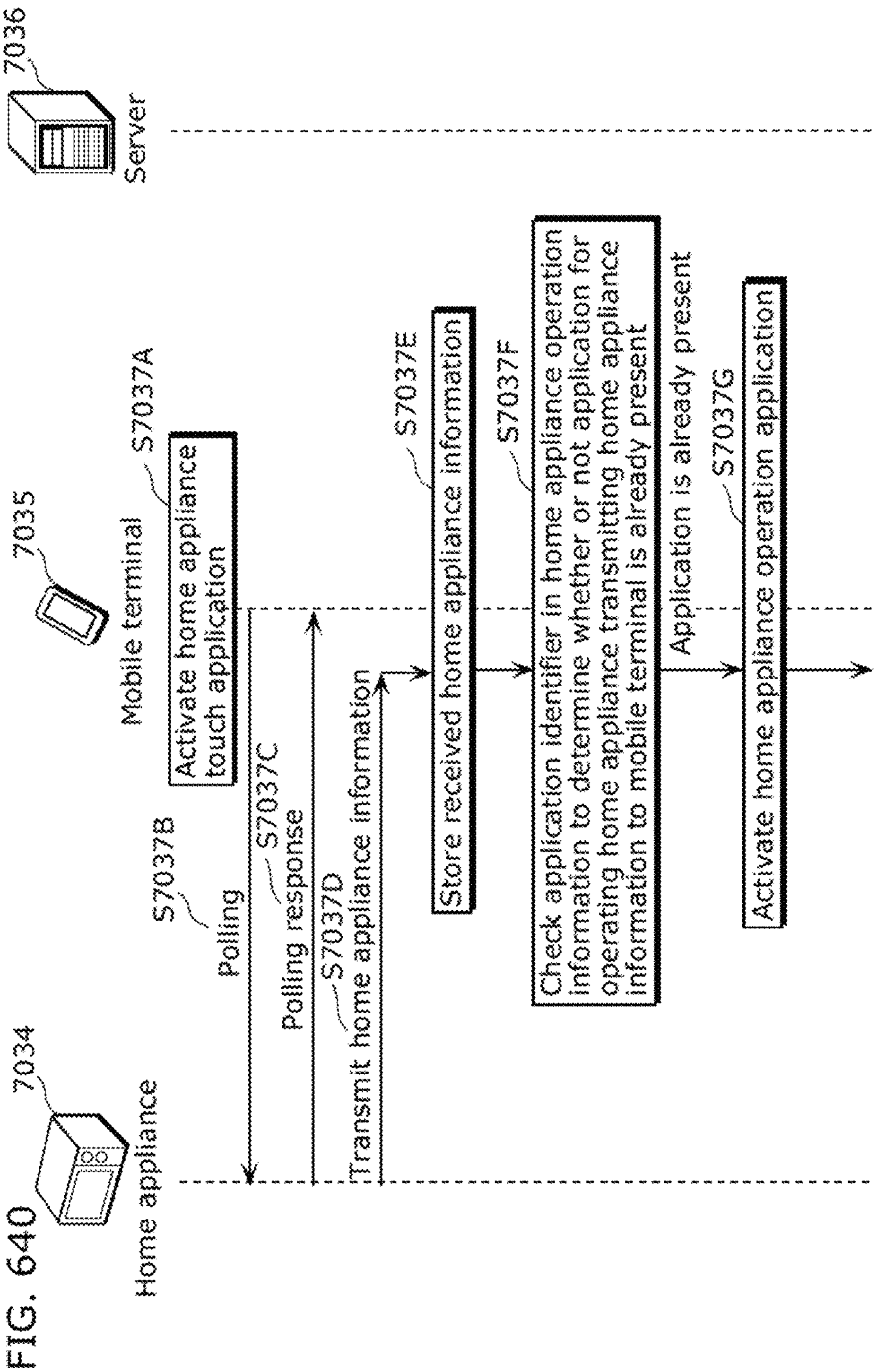

FIG. 640 is a diagram showing a structure and a sequence according to Embodiment H of the present invention.

Figure 641:
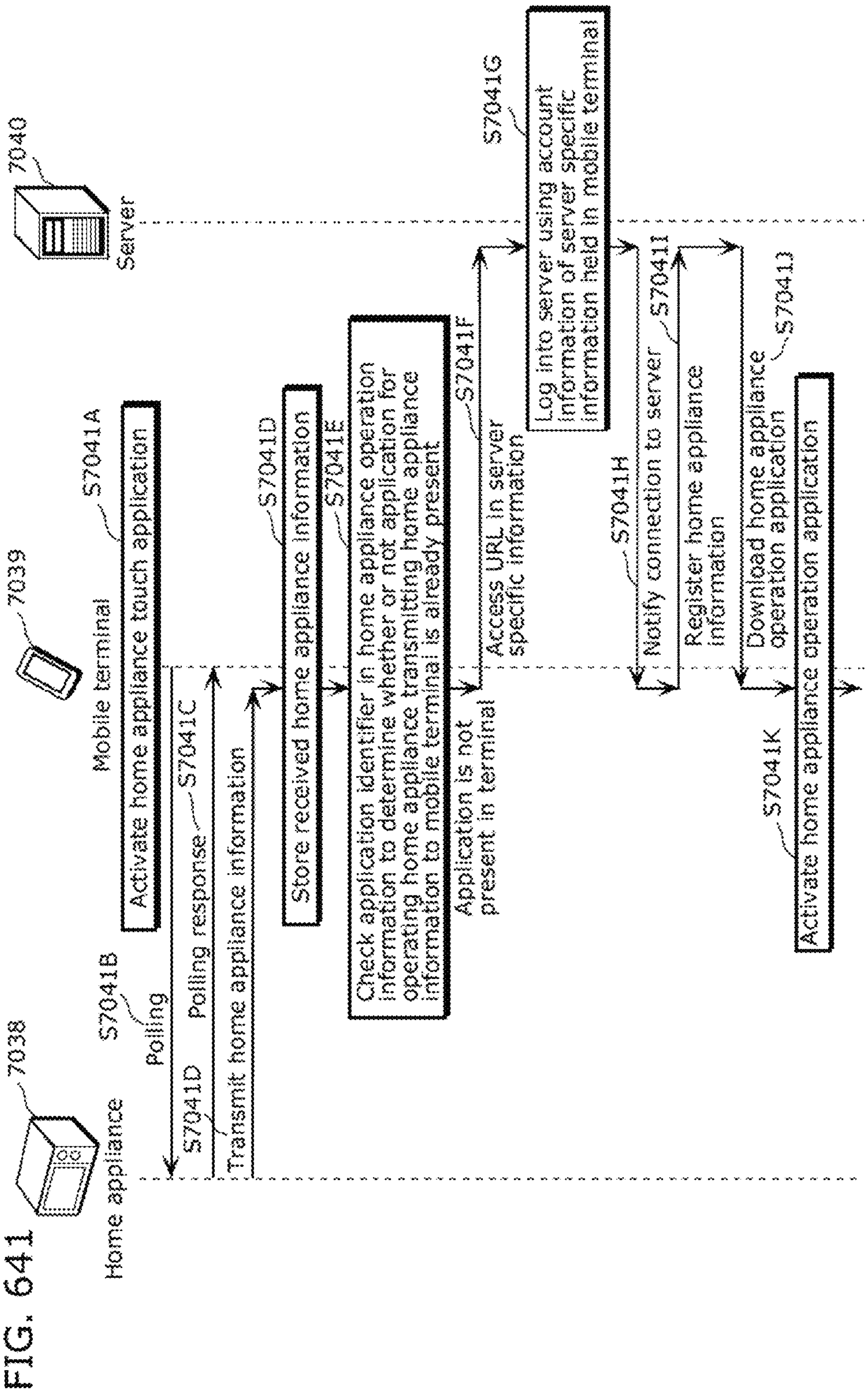

FIG. 641 is a diagram showing a structure and a sequence according to Embodiment H of the present invention.

Figure 642:

FIG. 642 is a diagram showing an example of information held in the mobile terminal according to Embodiment H of the present invention.

FIG. 643 is a diagram showing an example of information held in the mobile terminal according to Embodiment H of the present invention.

Figure 644:
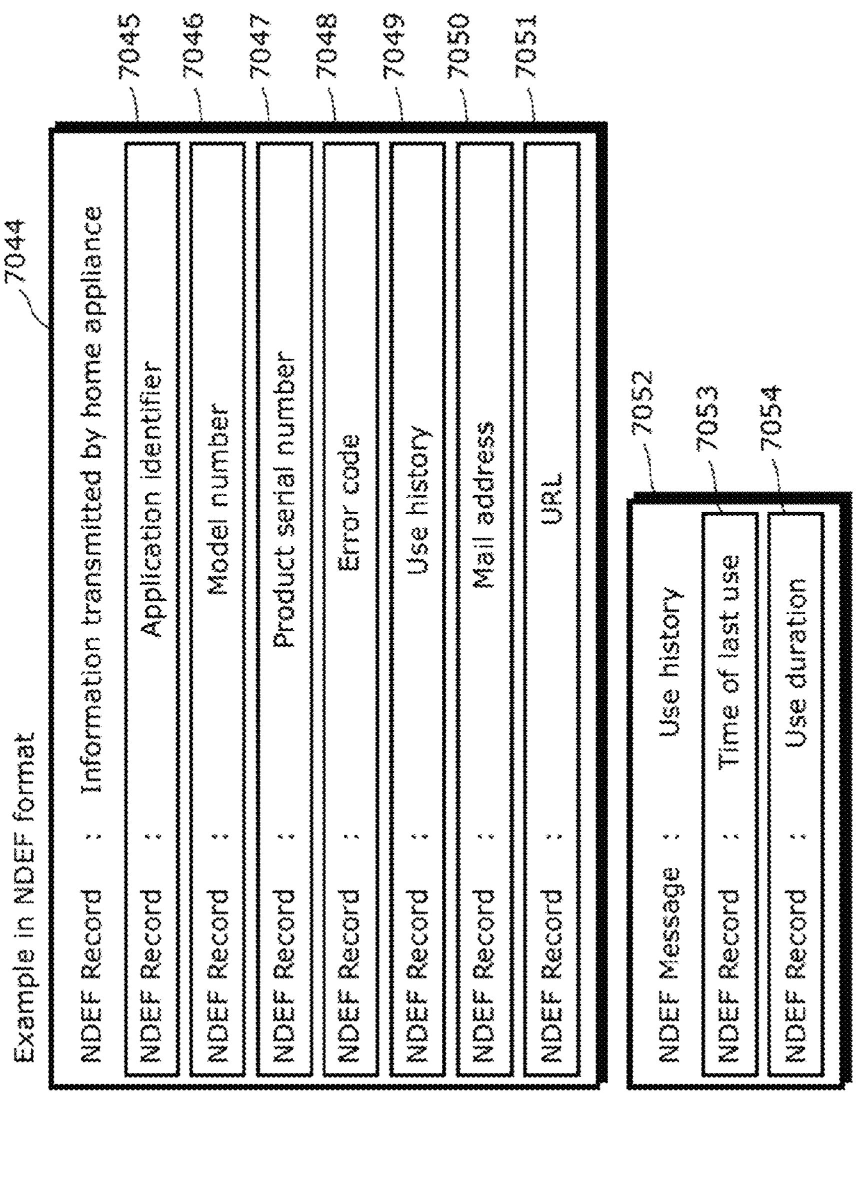

FIG. 644 is a diagram showing the case of using NDEF as an example of a data structure when performing proximity communication according to Embodiment H of the present invention.

FIG. 645 is a diagram showing an area list based on room arrangement information according to Embodiment H of the present invention.

FIG. 646 is a diagram showing a home appliance list of home appliances and their position information held in the mobile terminal according to Embodiment H of the present invention.

Figure 647:
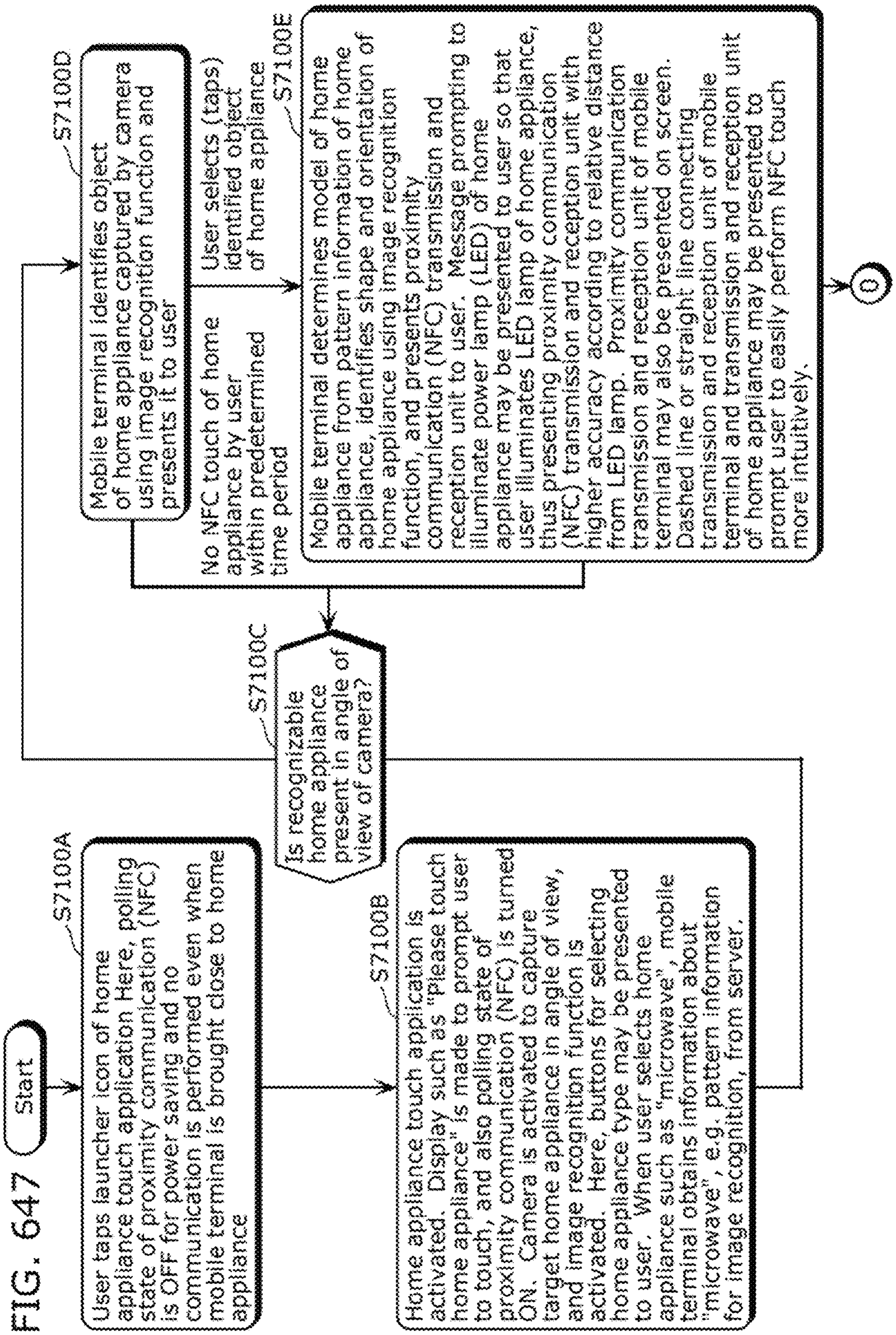

FIG. 647 is a flowchart showing a procedure according to Embodiment H of the present invention.

Figure 648:
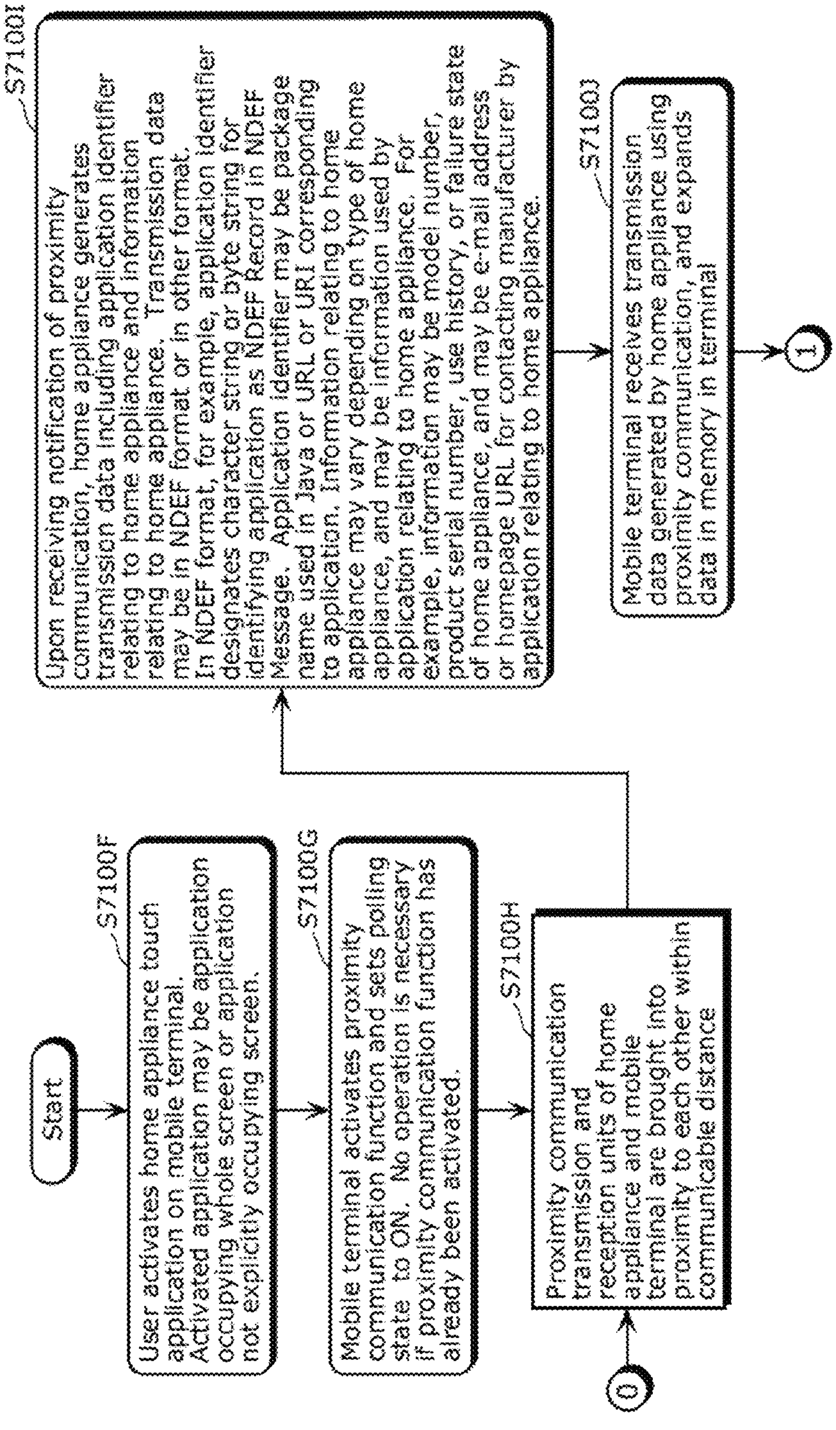

FIG. 648 is a flowchart showing a procedure according to Embodiment H of the present invention.

Figure 649:
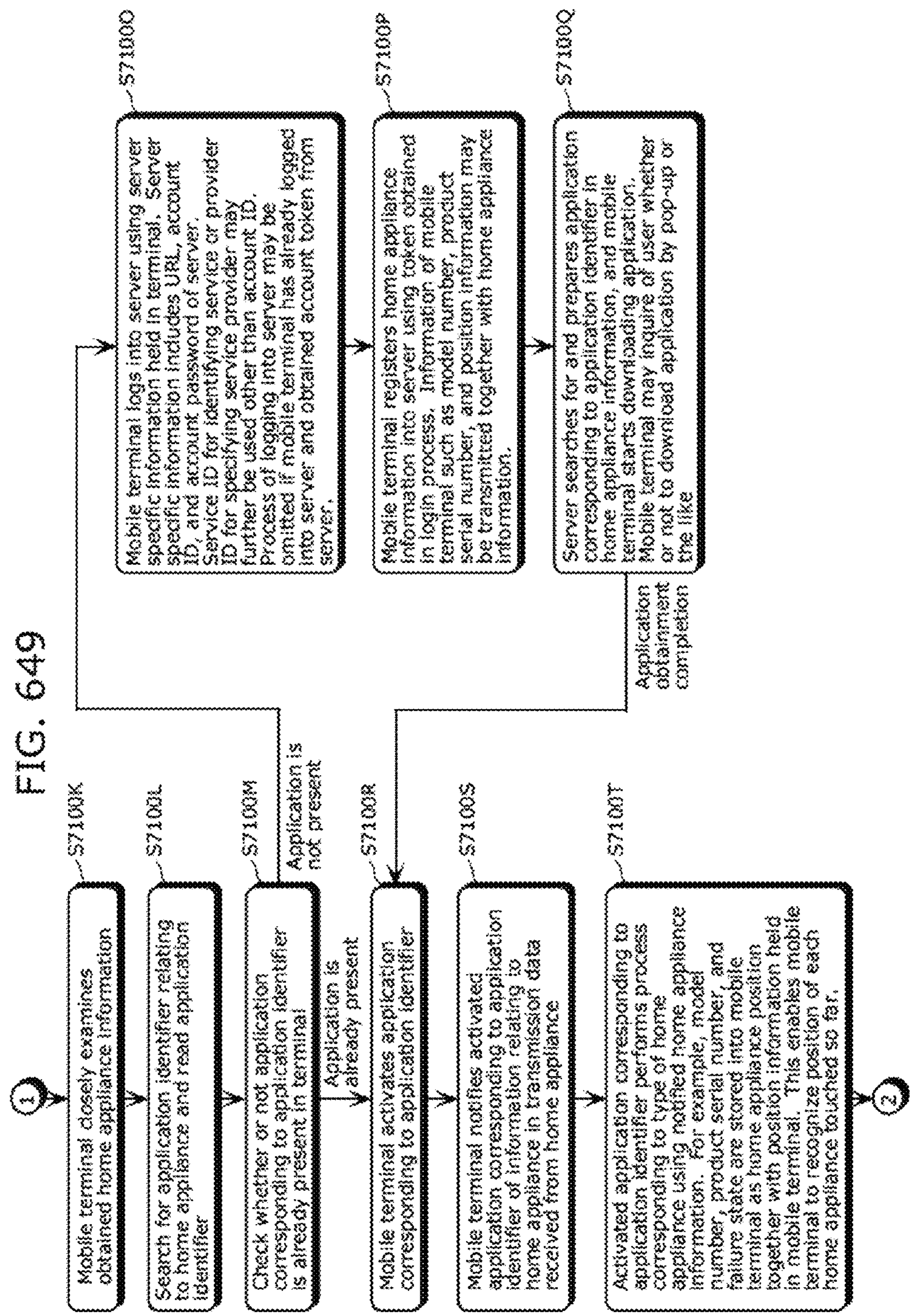

FIG. 649 is a flowchart showing a procedure according to Embodiment H of the present invention.

Figure 650:
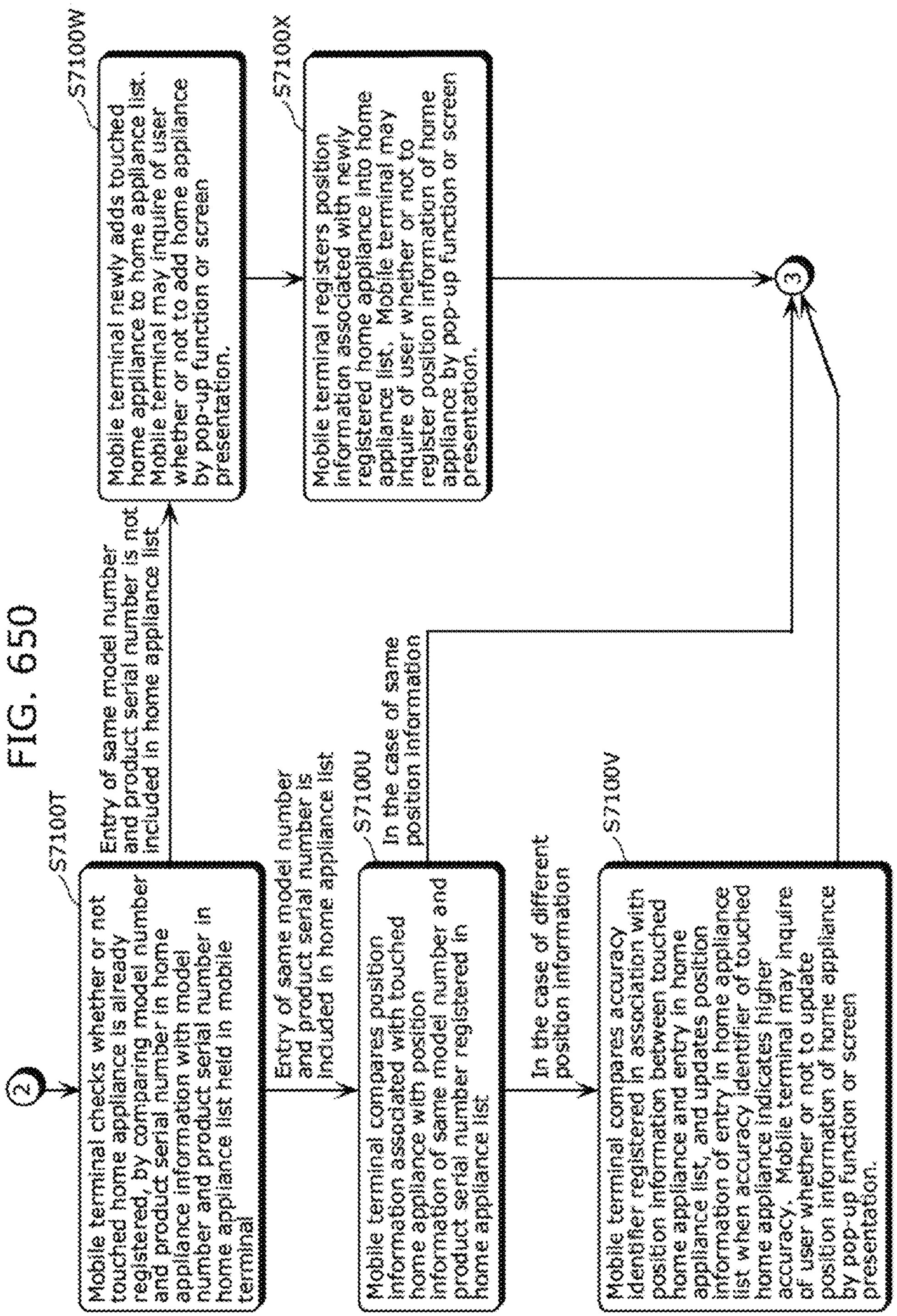

FIG. 650 is a flowchart showing a procedure according to Embodiment H of the present invention.

Figure 651:
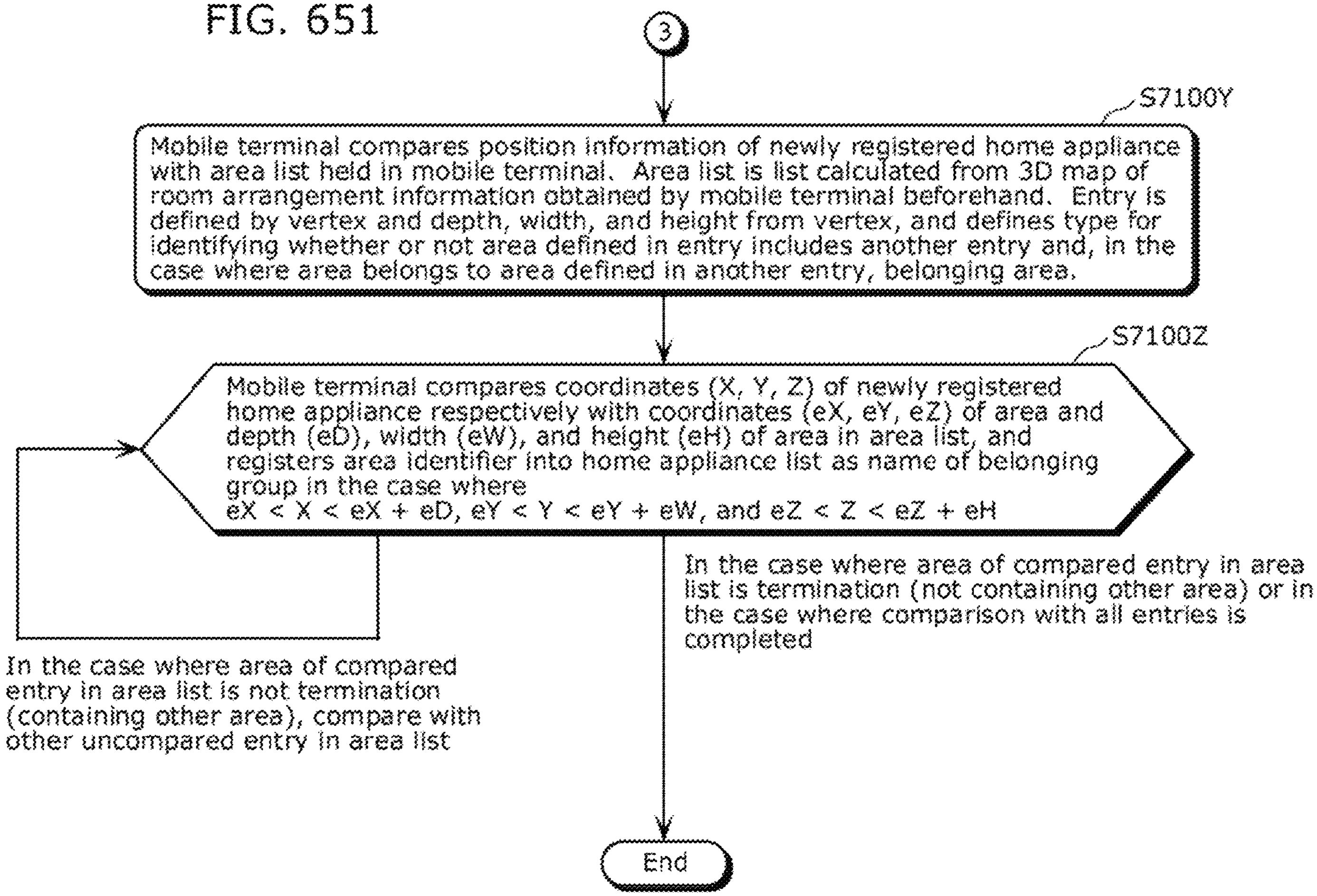

FIG. 651 is a flowchart showing a procedure according to Embodiment H of the present invention.

Figure 652:
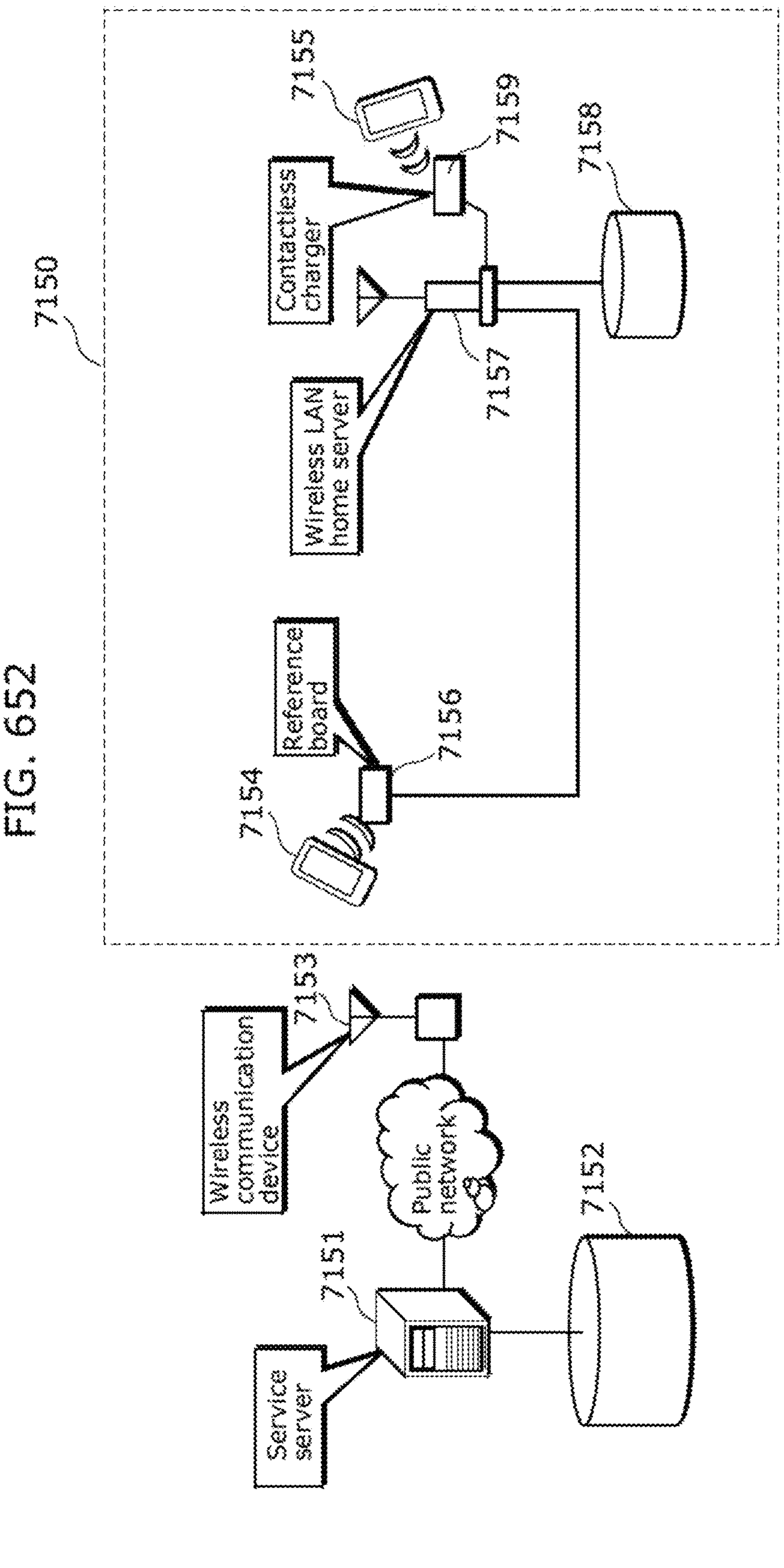

FIG. 652 is a diagram showing a structure according to Embodiment I of the present invention.

Figure 653:
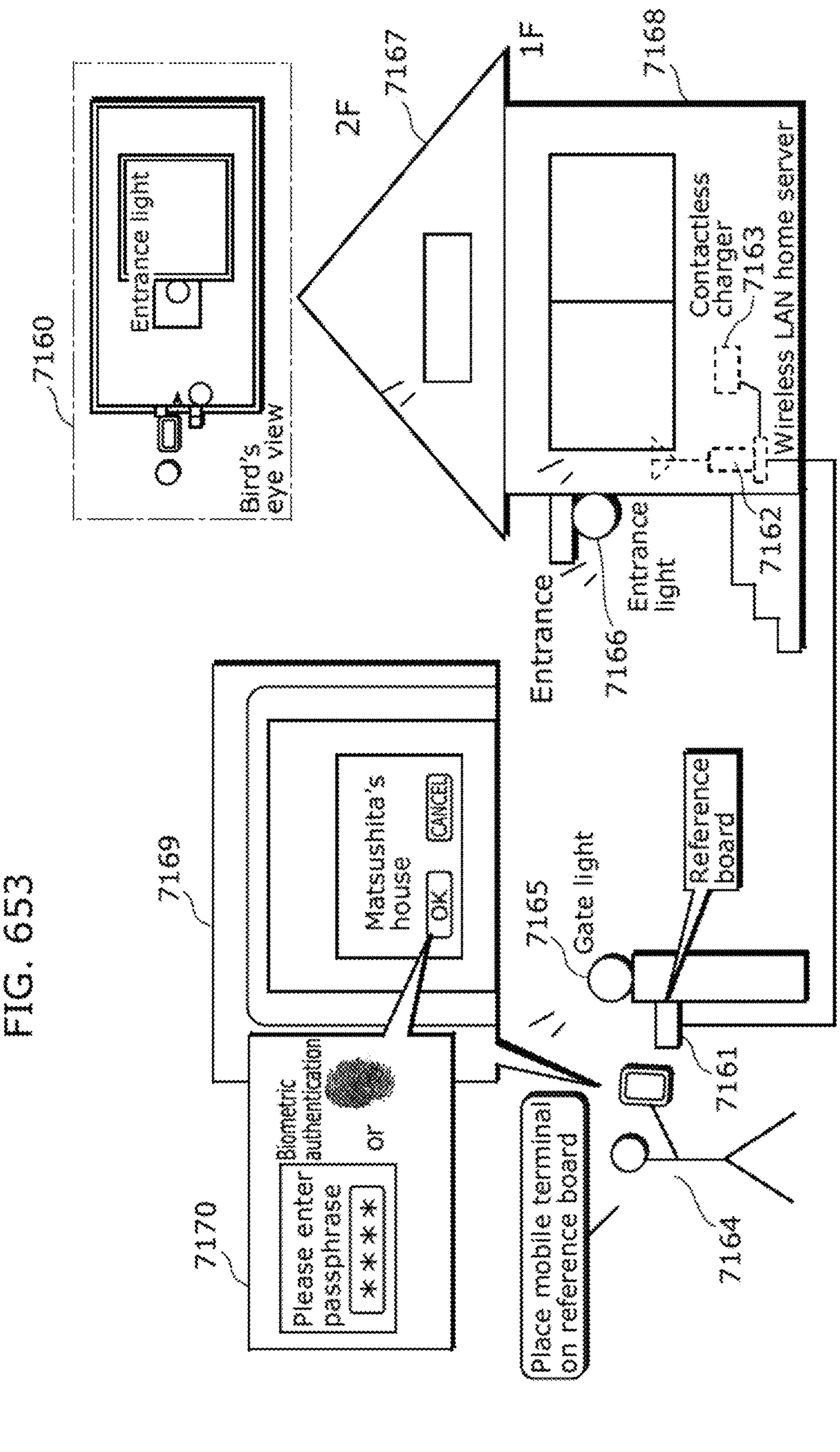

FIG. 653 is a diagram showing display of a screen of a mobile terminal when starting use of a home appliance operation application and relationships between peripheral appliances and the structure according to Embodiment I including a bird's eye view, in the case of implementing the structure according to Embodiment I.

Figure 654:
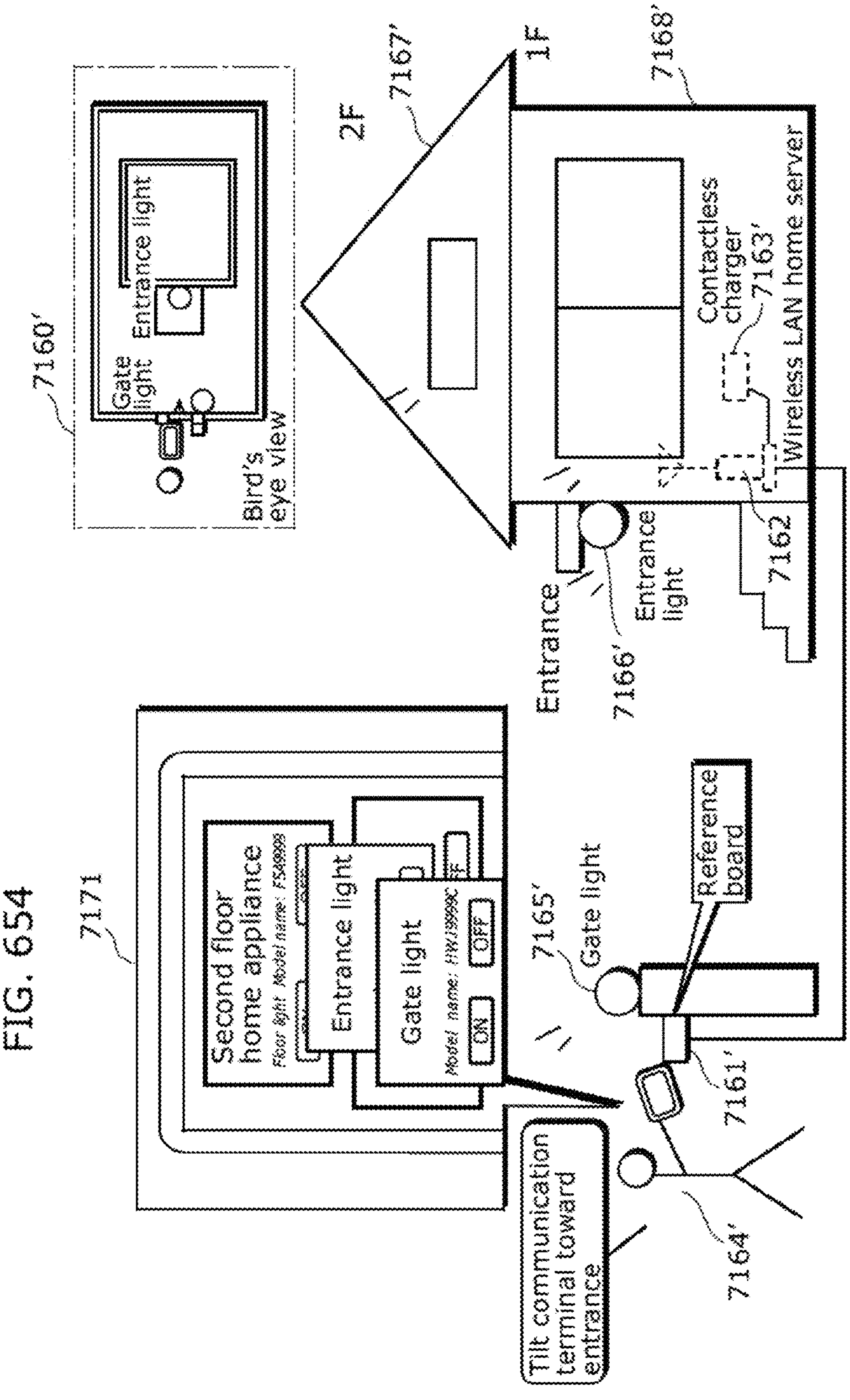

FIG. 654 is a diagram showing display of the screen of the mobile terminal during use of the home appliance operation application and relationships between the peripheral appliances and the structure according to Embodiment I including a bird's eye view, in the case of implementing the structure according to Embodiment I.

Figure 655:
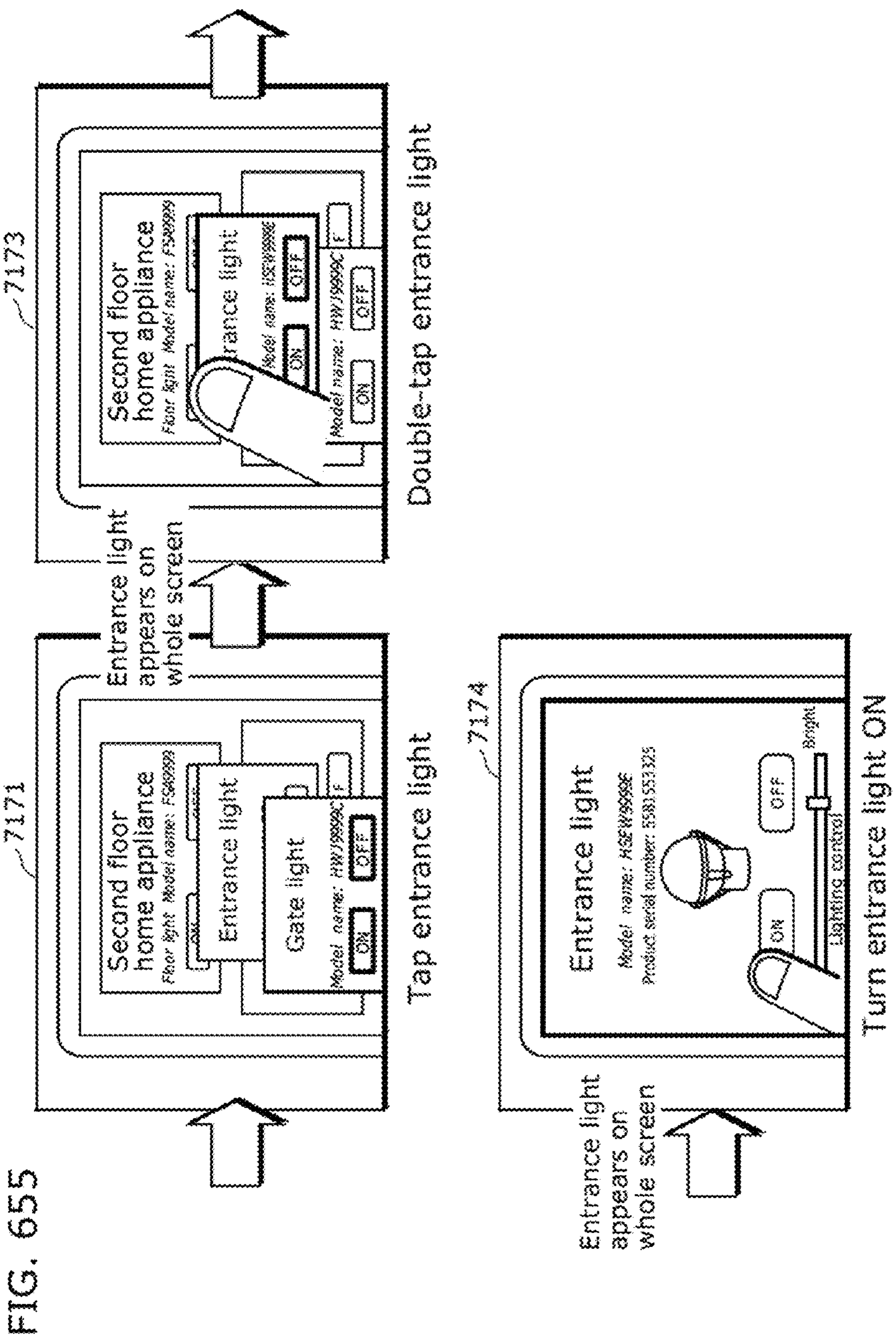

FIG. 655 is a diagram showing display of the screen of the mobile terminal during use of the home appliance operation application and relationships between the peripheral appliances and the structure according to Embodiment I including a bird's eye view, in the case of implementing the structure according to Embodiment I.

Figure 656:
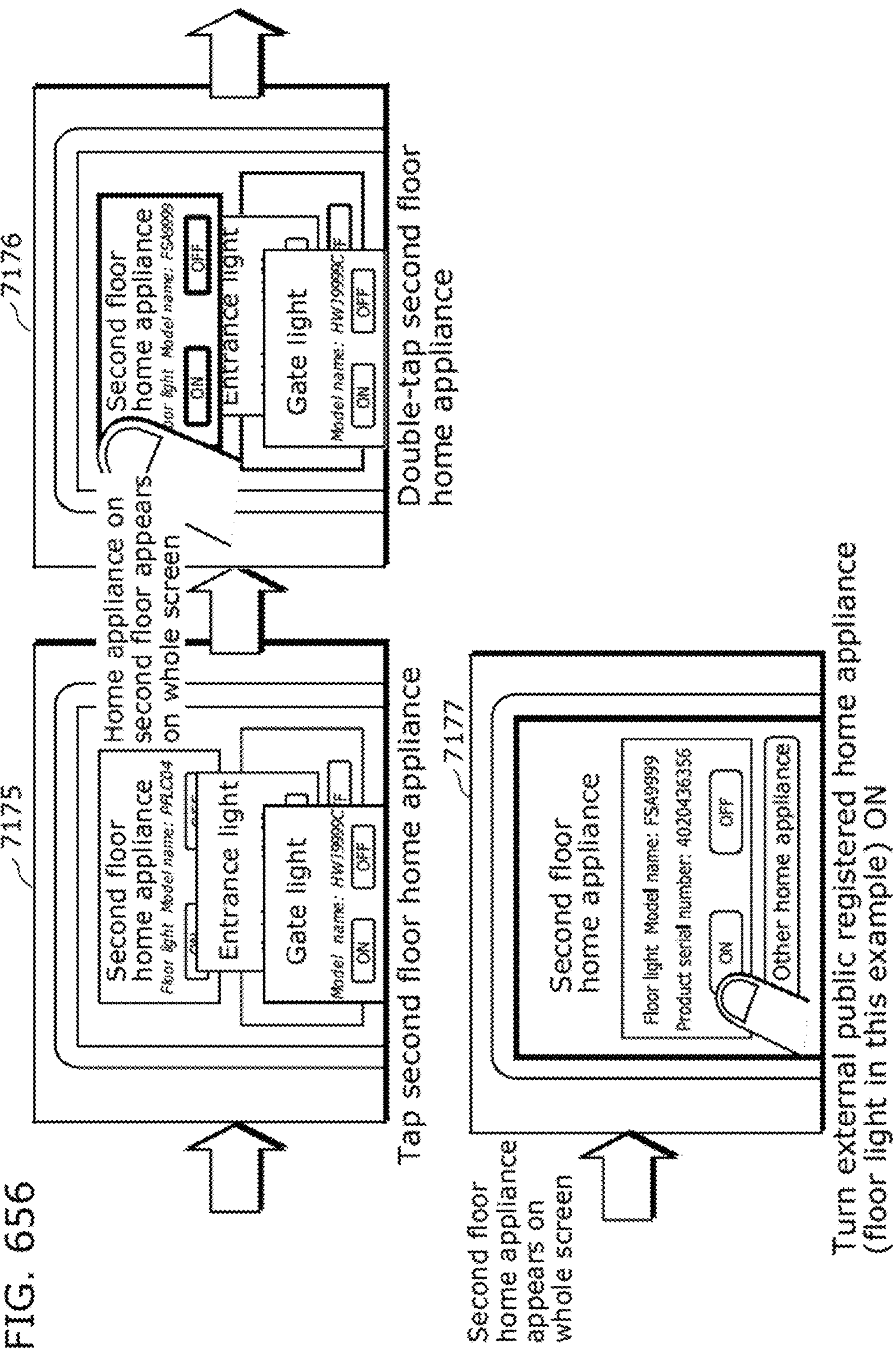

FIG. 656 is a diagram showing display of the screen of the mobile terminal during use of the home appliance operation application and relationships between the peripheral appliances and the structure according to Embodiment I including a bird's eye view, in the case of implementing the structure according to Embodiment I.

Figure 657:
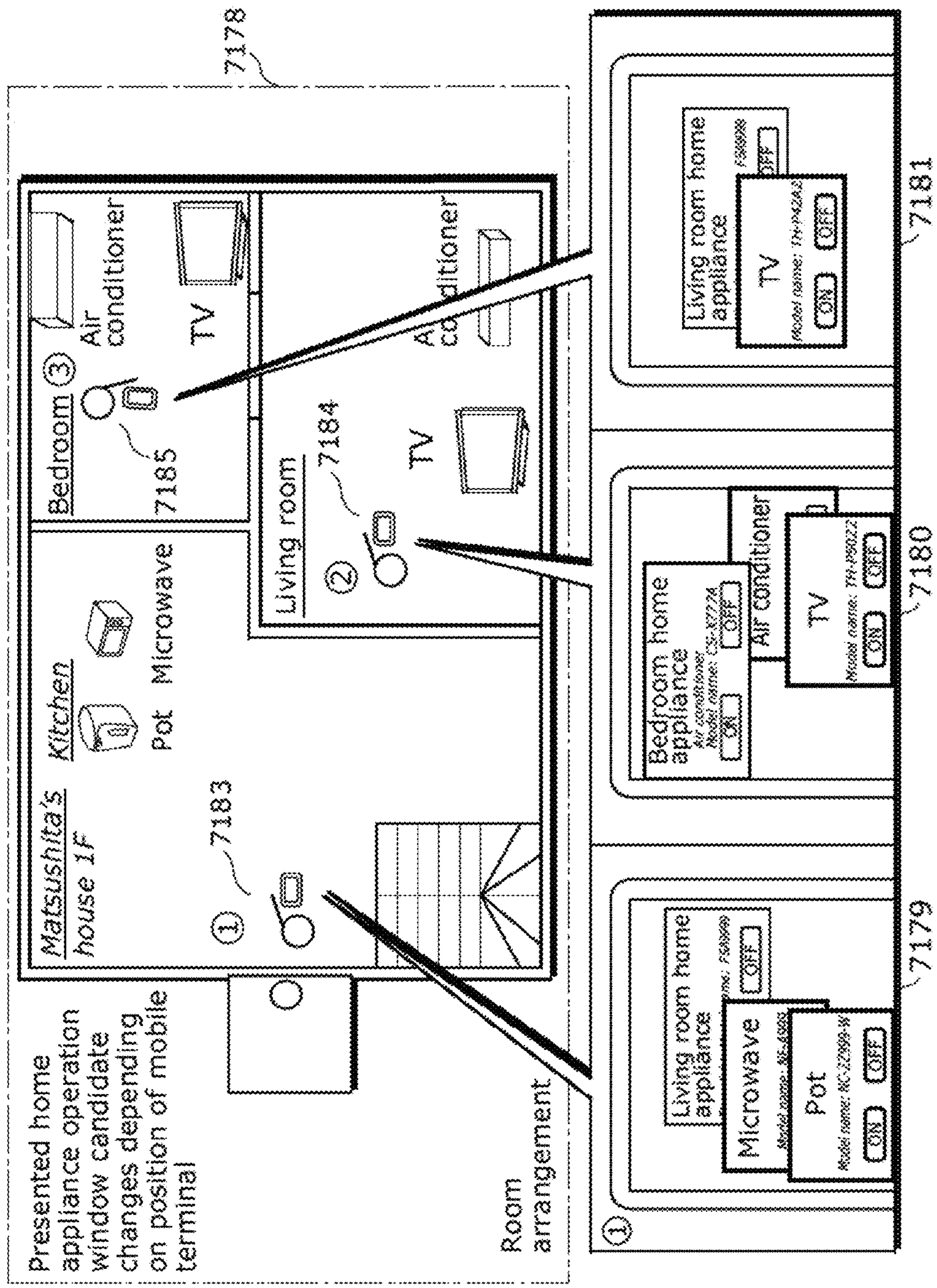

FIG. 657 is a diagram for describing room arrangement information, an area list, and a home appliance list in a home according to Embodiment I of the present invention.

FIG. 658 is a diagram showing an unlock table 7182 according to Embodiment I of the present invention.

Figure 659:
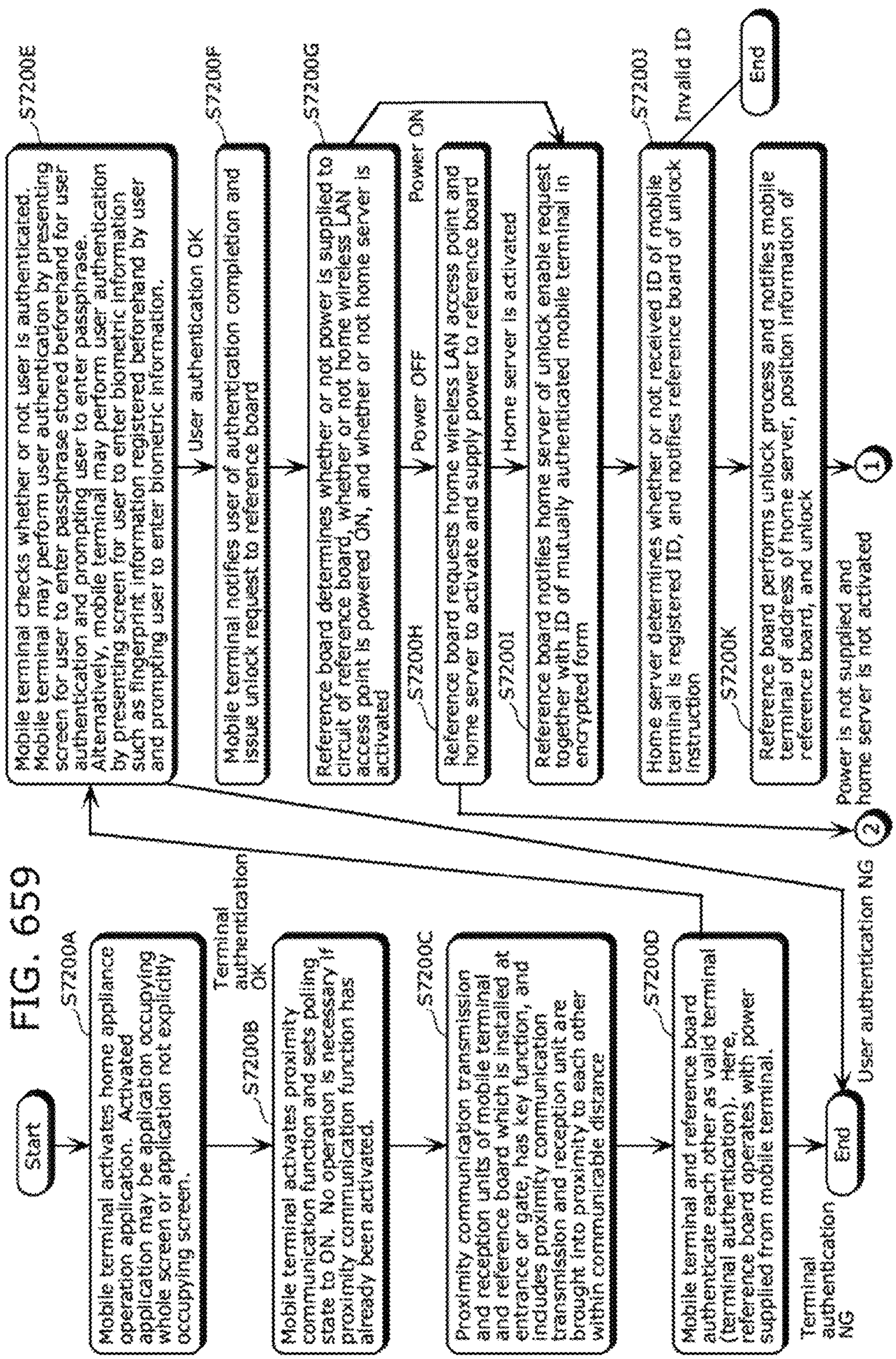

FIG. 659 is a flowchart showing a procedure according to Embodiment I of the present invention.

Figure 660:
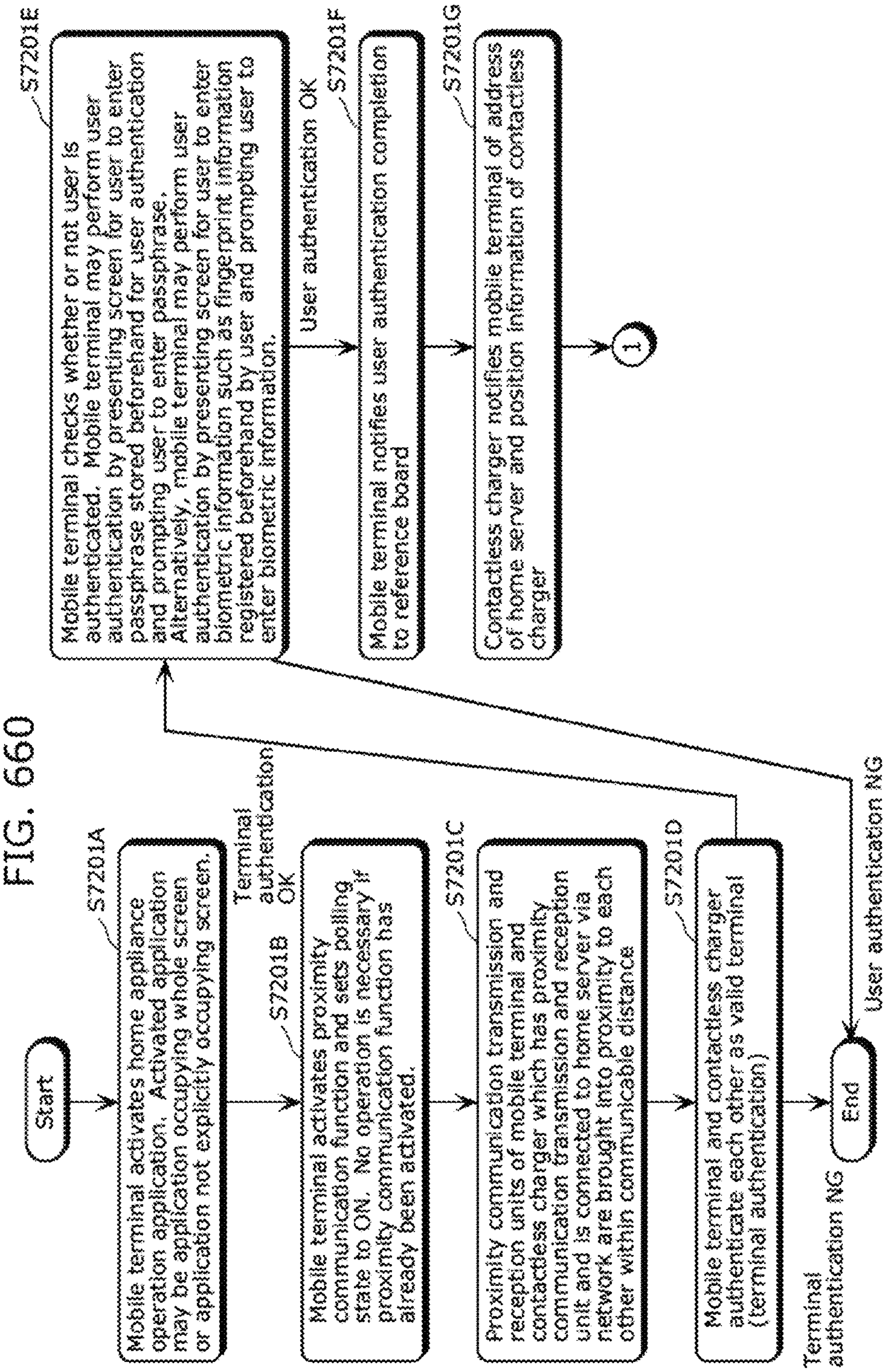

FIG. 660 is a flowchart showing a procedure according to Embodiment I of the present invention.

Figure 661:
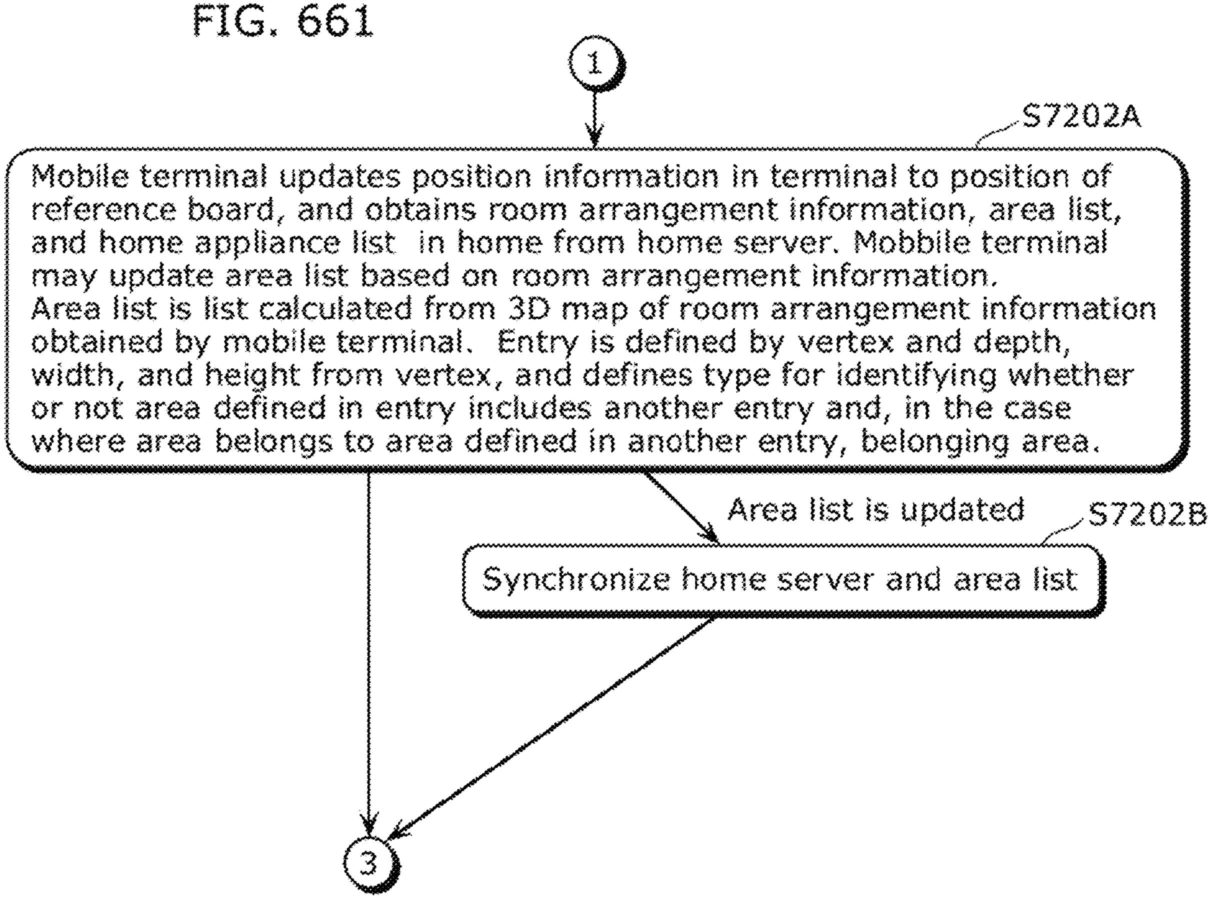

FIG. 661 is a flowchart showing a procedure according to Embodiment I of the present invention.

Figure 662:
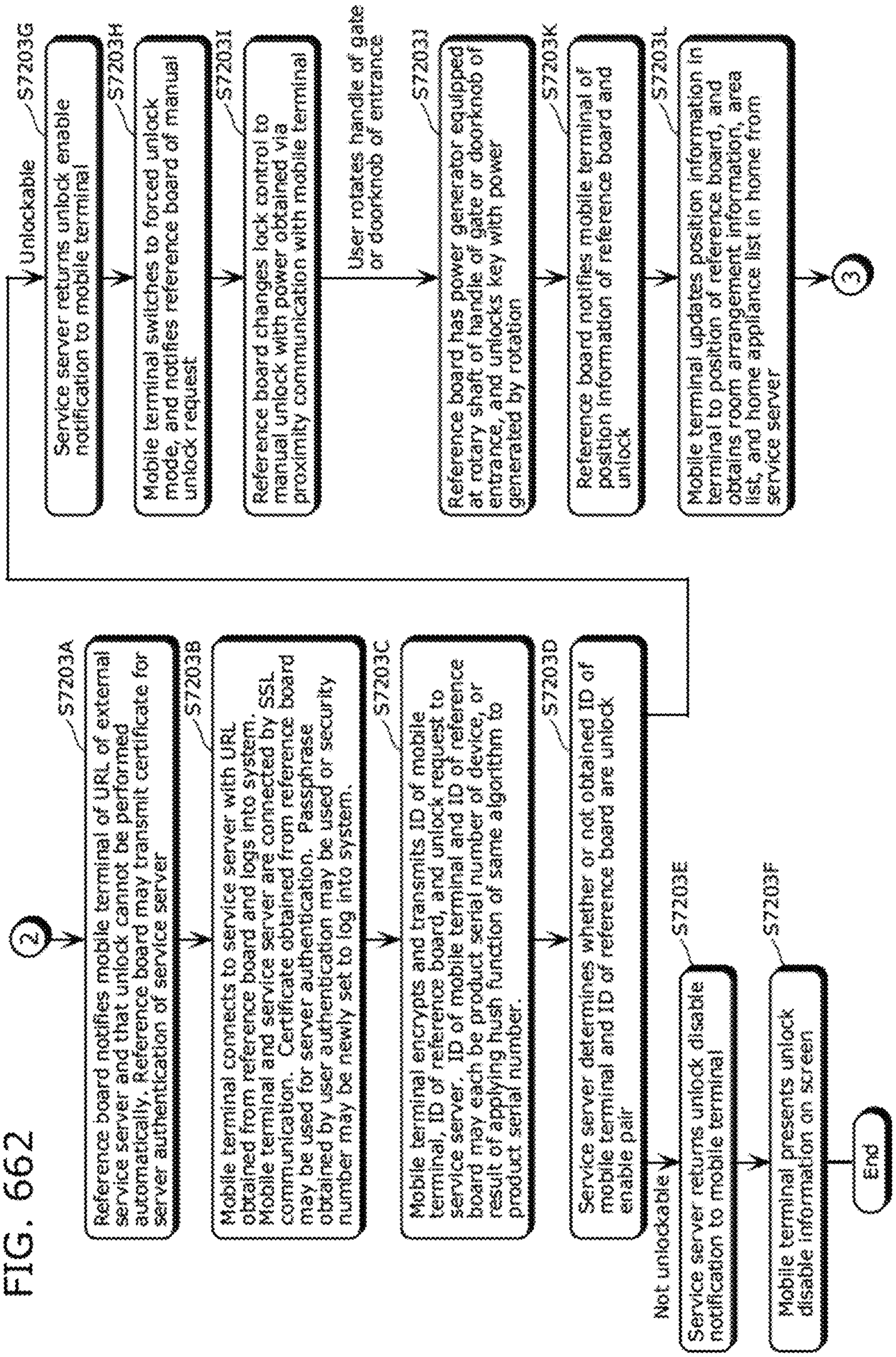

FIG. 662 is a flowchart showing a procedure according to Embodiment I of the present invention.

Figure 663:
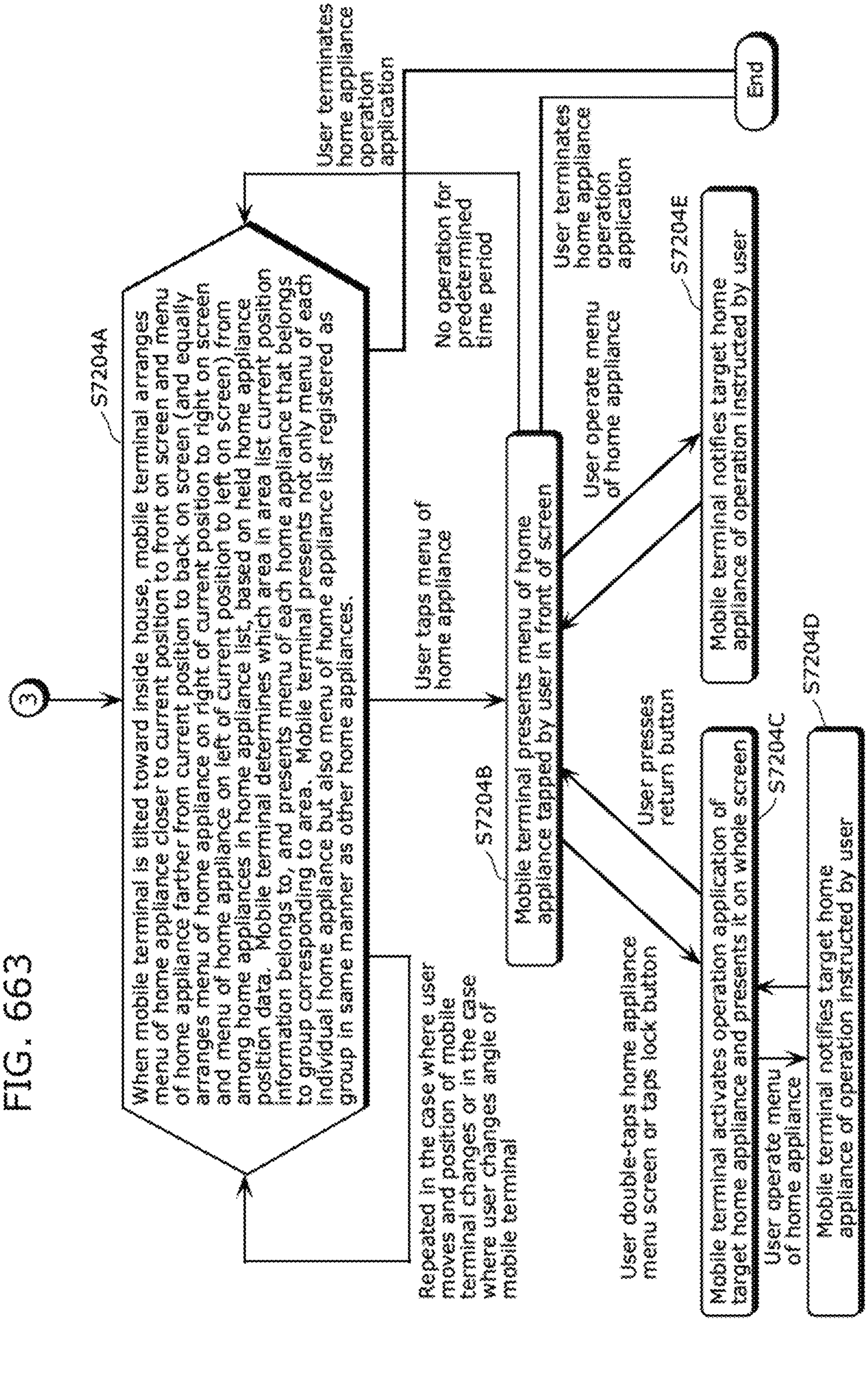

FIG. 663 is a flowchart showing a procedure according to Embodiment I of the present invention.

Figure 664:
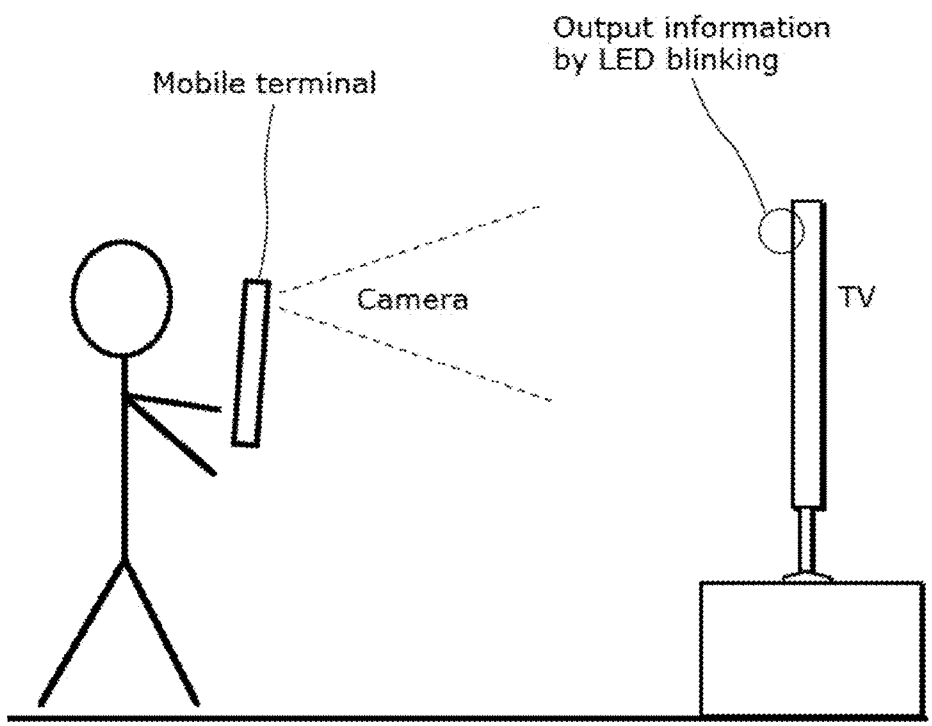

FIG. 664 is a diagram showing an example of a communication situation by optical communication according to Embodiment J of the present invention.

Figure 665:
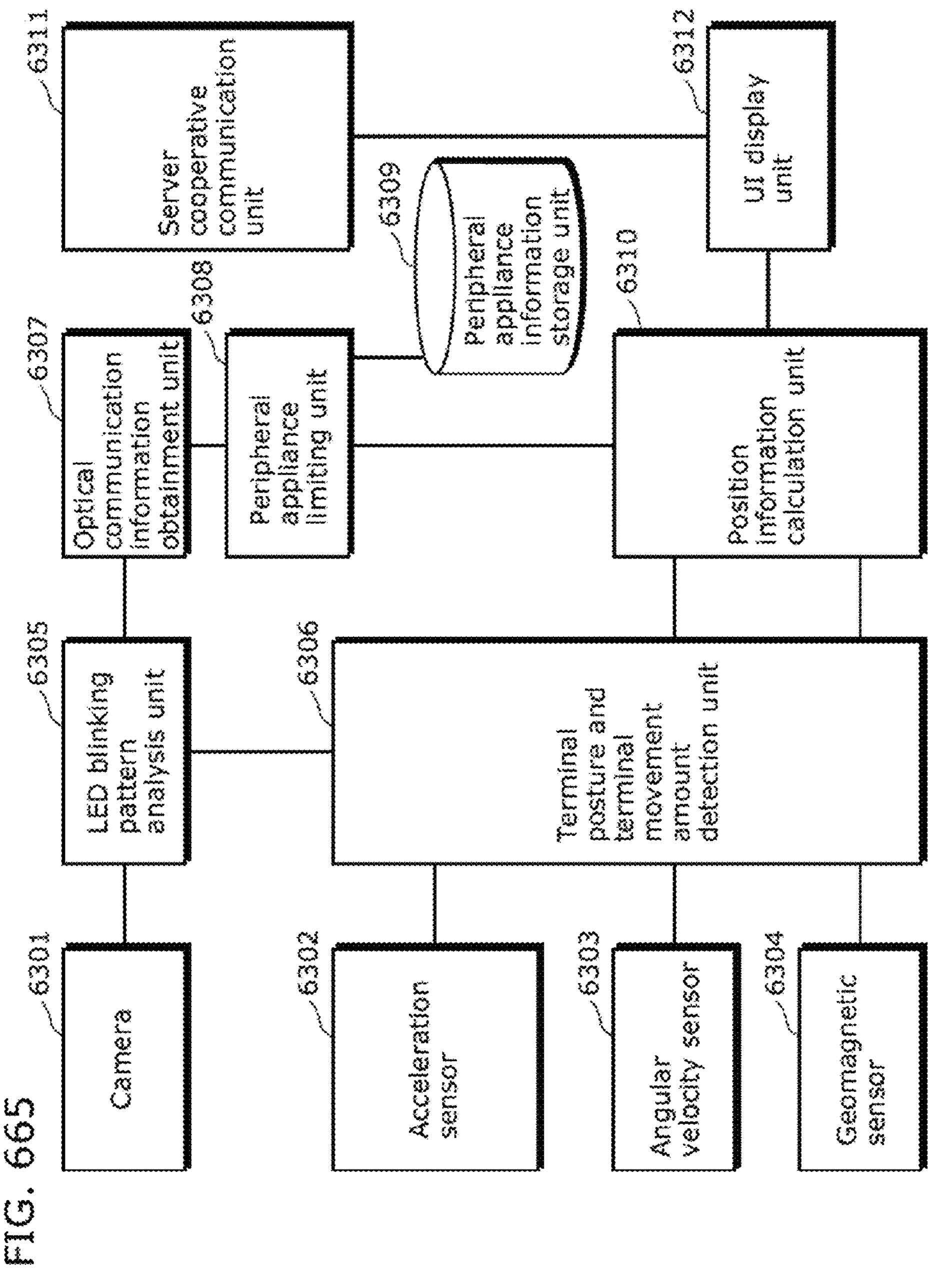

FIG. 665 is a diagram showing a structure of a mobile terminal according to Embodiment J of the present invention.

Figure 666:
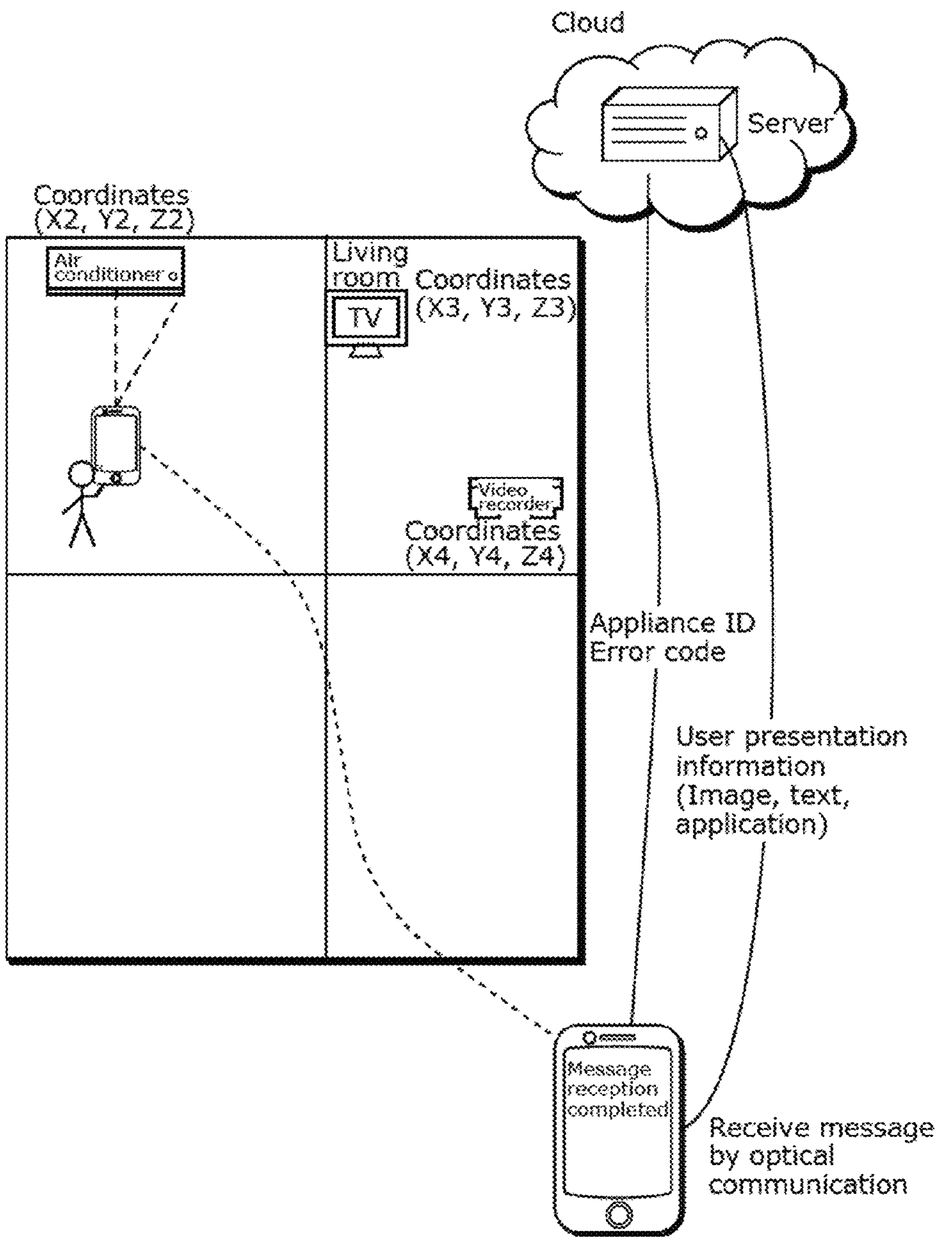

FIG. 666 is a diagram showing a situation where a peripheral appliance transmits information of the peripheral appliance using an optical communication technique according to Embodiment J of the present invention.

FIG. 667 is a diagram showing an example of information transmitted from a peripheral appliance by optical communication according to Embodiment J of the present invention.

Figure 668:
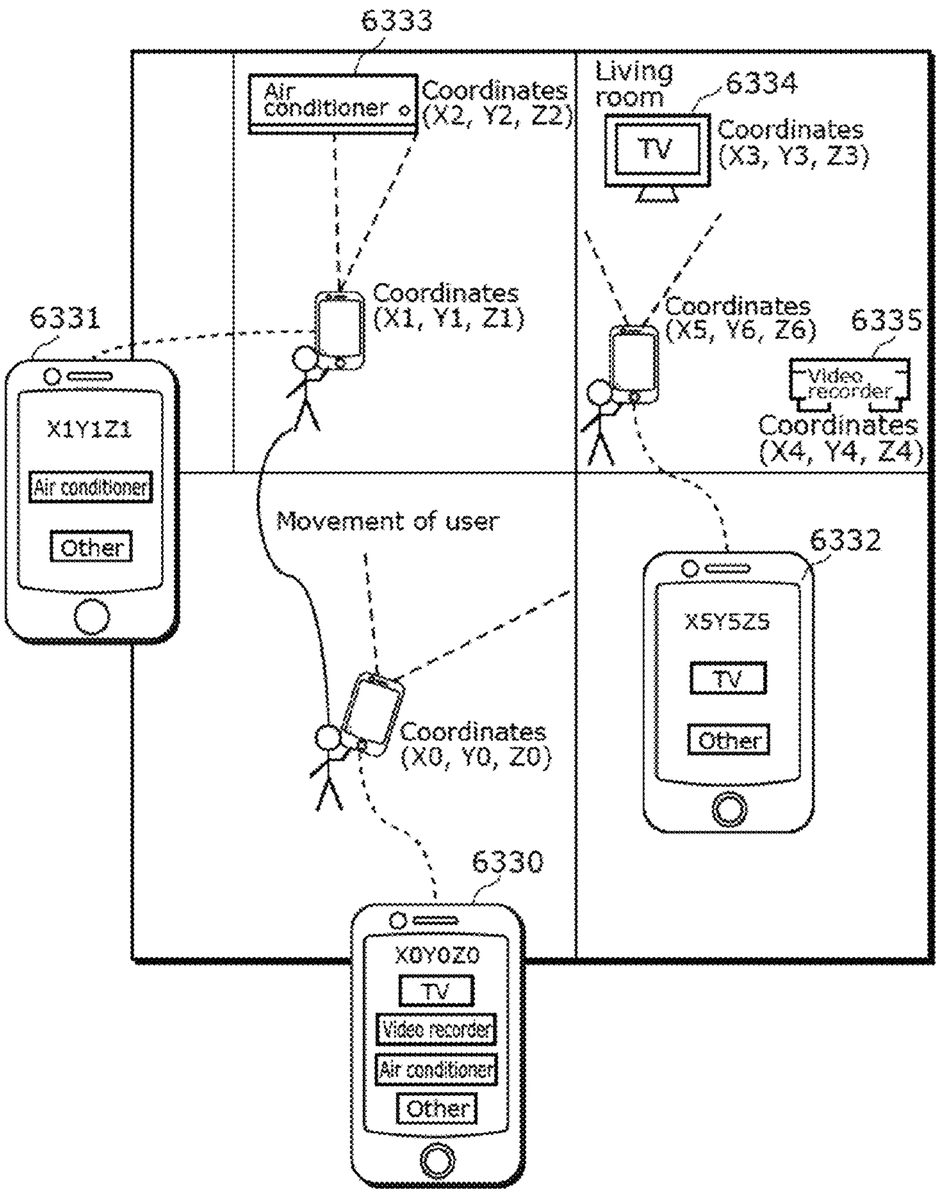

FIG. 668 is a diagram showing an example of communication between a user position and a peripheral appliance by optical communication in a map assuming inside of a home according to Embodiment J of the present invention.

Figure 669:
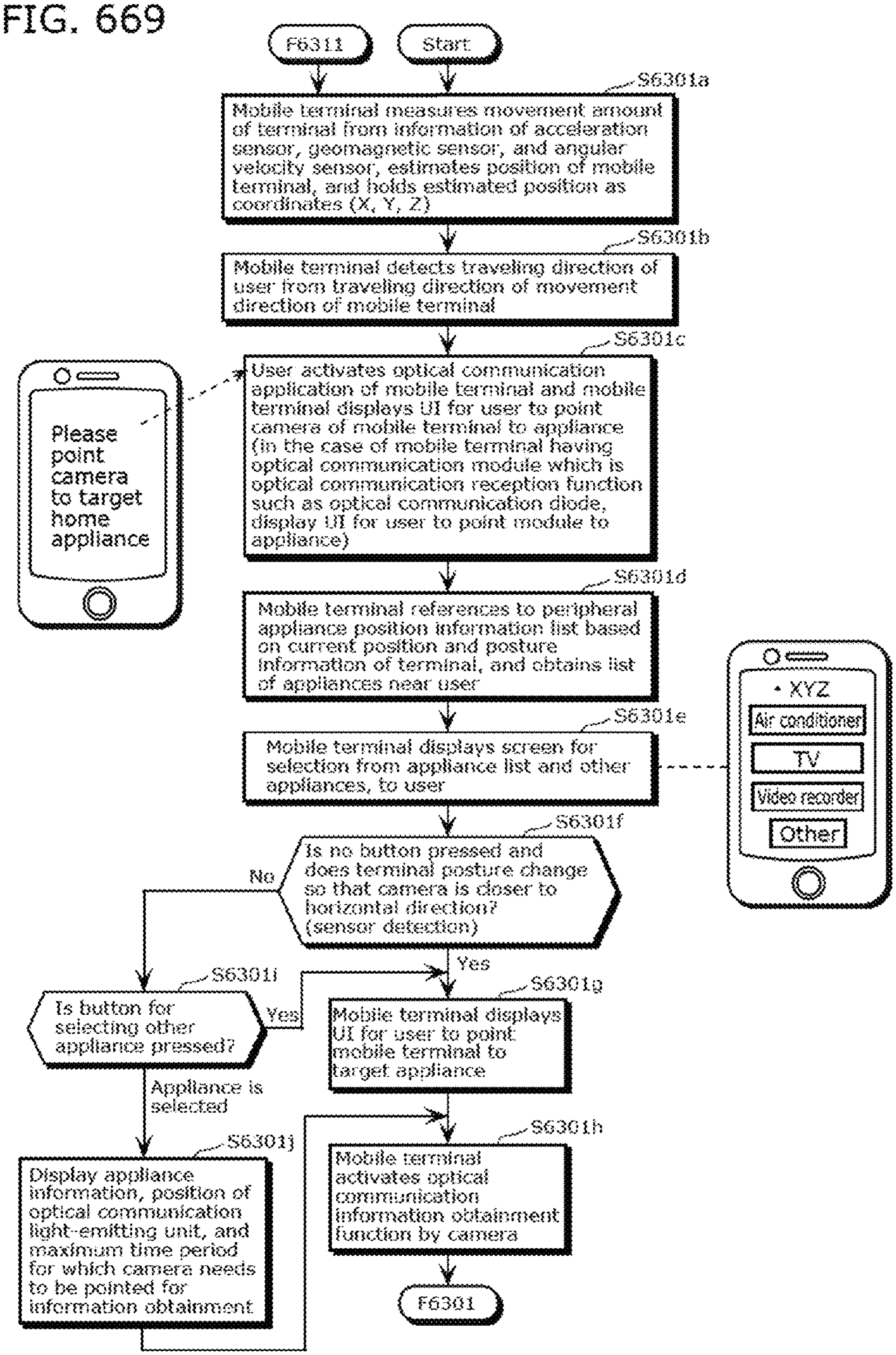

FIG. 669 is a flowchart showing process flow according to Embodiment J of the present invention.

Figure 670:
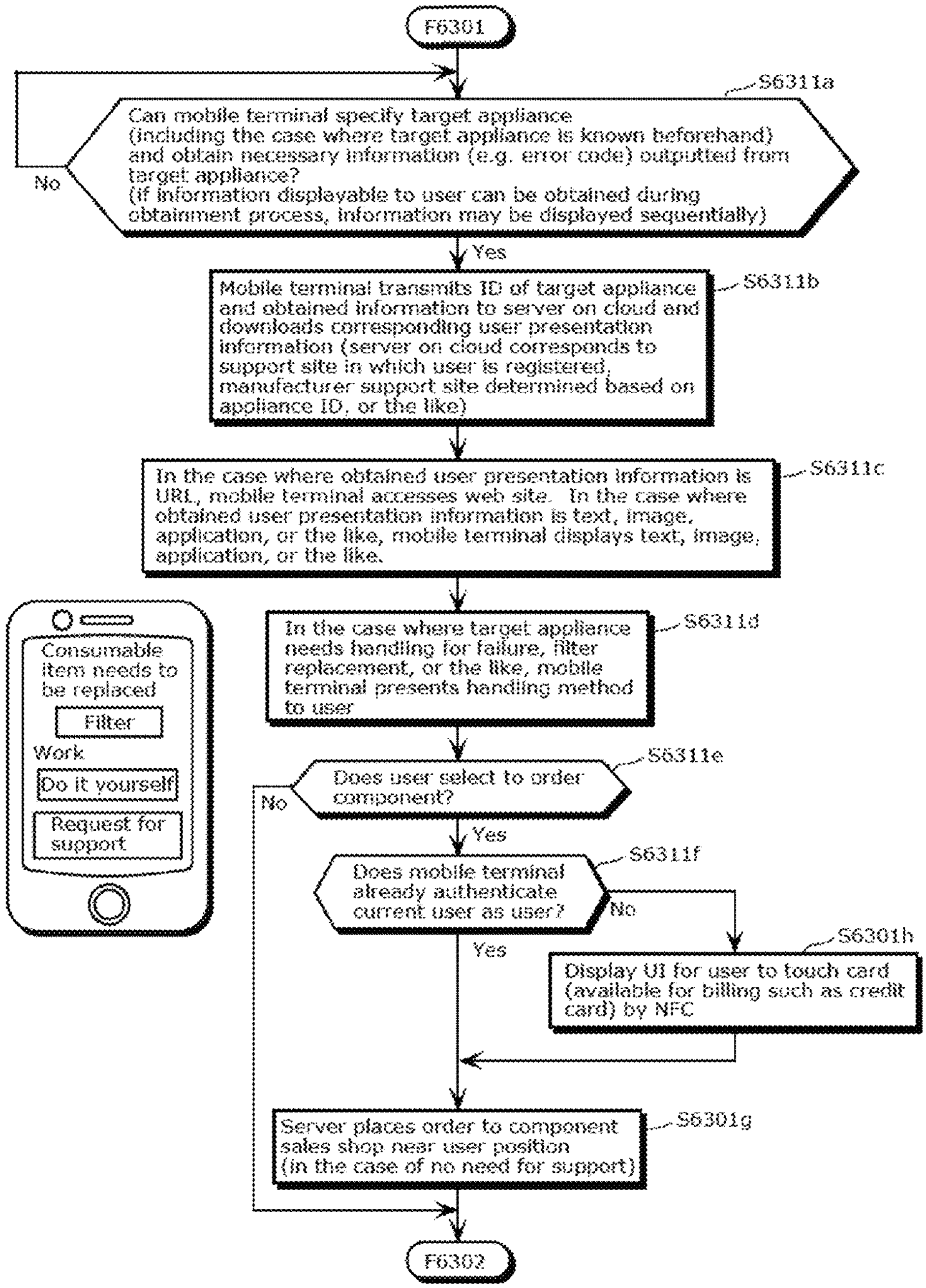

FIG. 670 is a flowchart showing process flow according to Embodiment J of the present invention.

Figure 671:
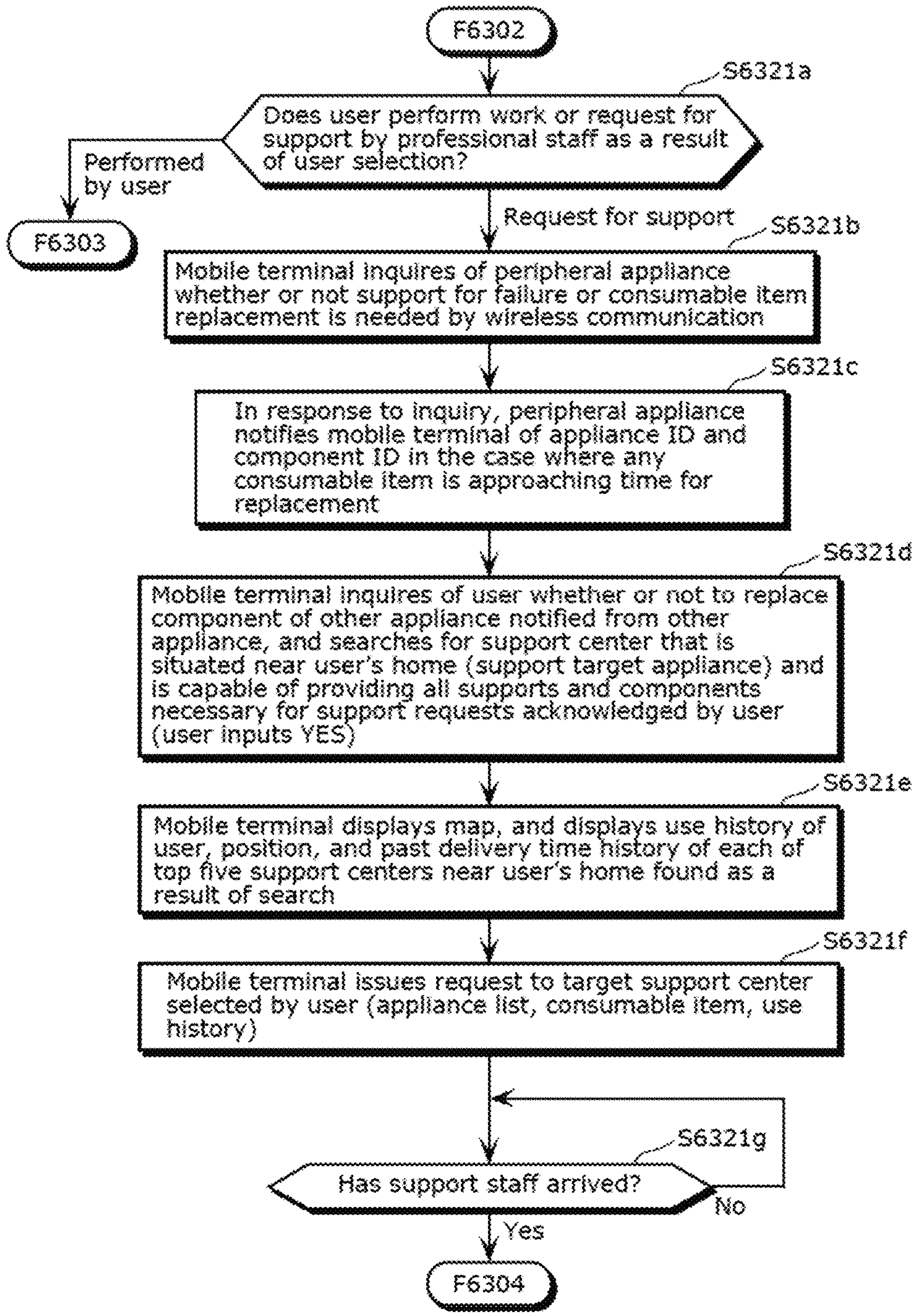

FIG. 671 is a flowchart showing process flow according to Embodiment J of the present invention.

Figure 672:
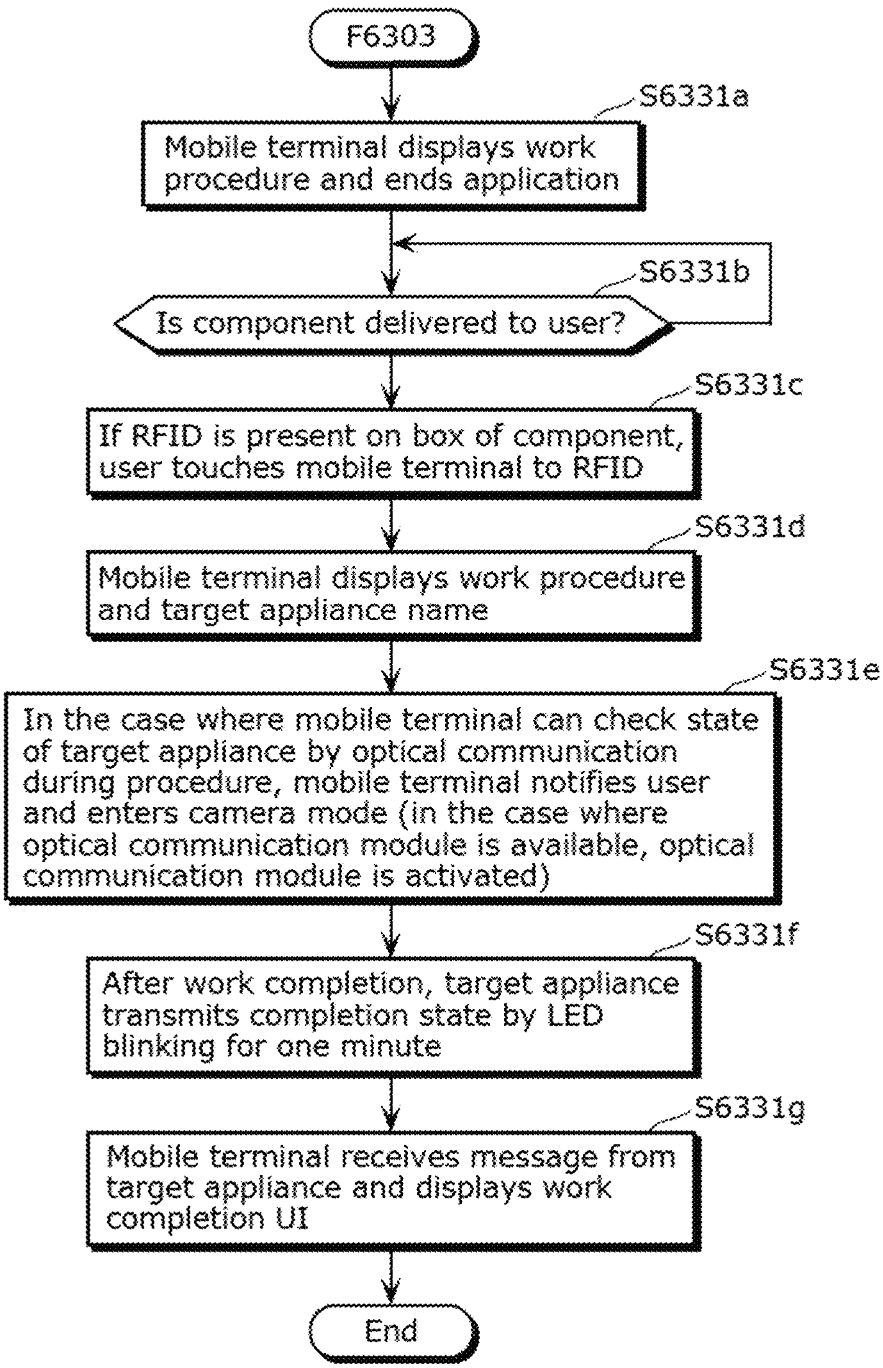

FIG. 672 is a flowchart showing process flow according to Embodiment J of the present invention.

Figure 673:
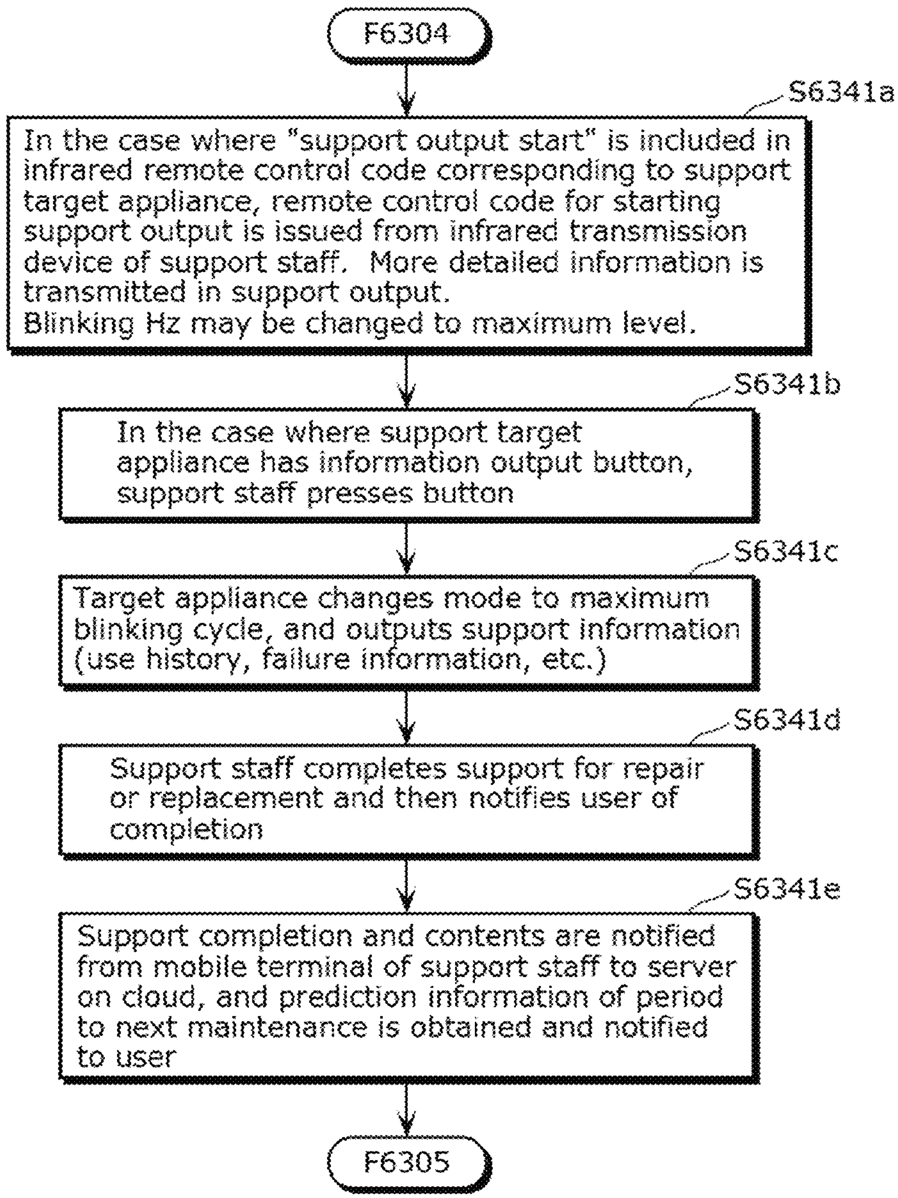

FIG. 673 is a flowchart showing process flow according to Embodiment J of the present invention.

Figure 674:
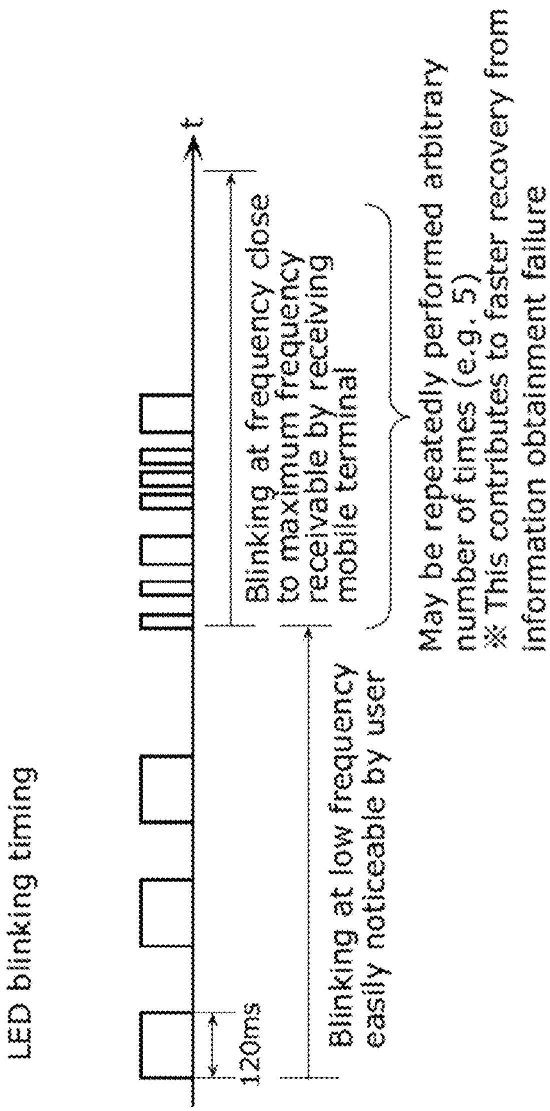

FIG. 674 is a diagram for describing a method of simultaneously realizing a blinking pattern easily noticeable by a user and optical communication.

Figure 675:
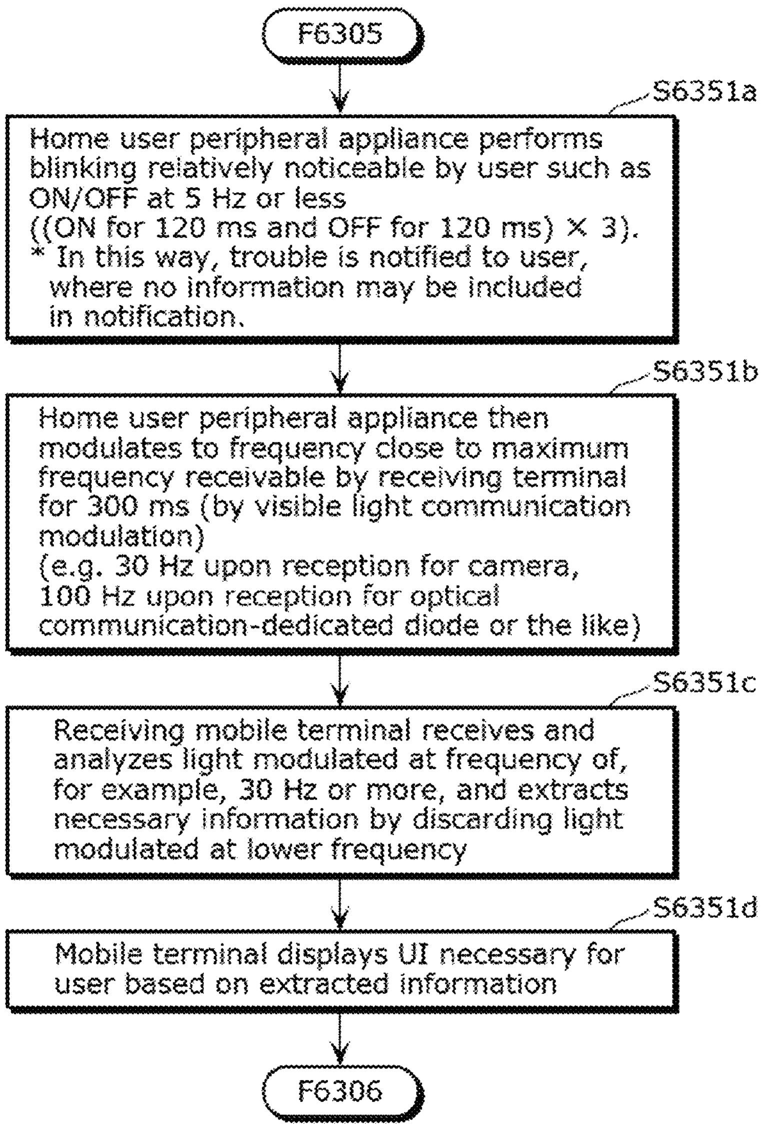

FIG. 675 is a flowchart showing process flow according to Embodiment J of the present invention.

FIG. 676 is a diagram for describing an information exchange method using NFC and optical communication.

Figure 677:
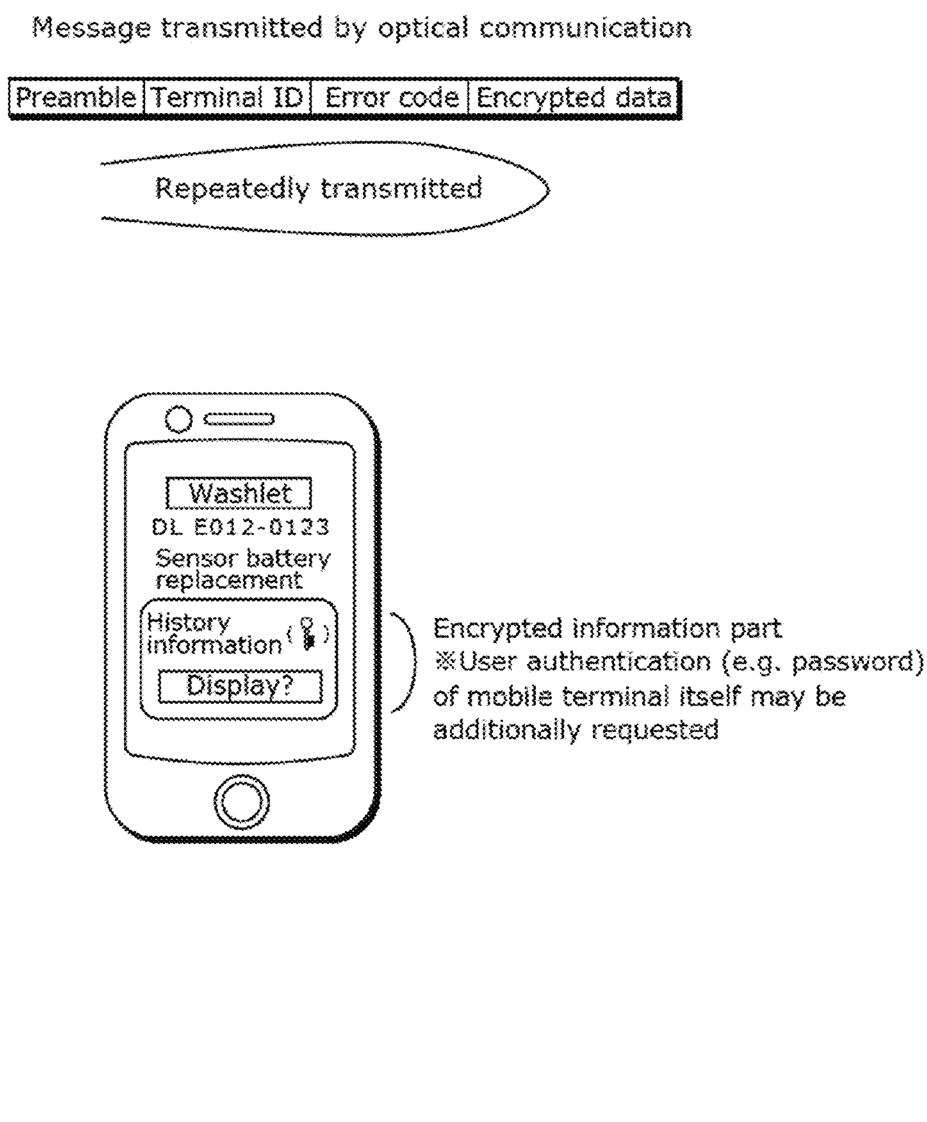

FIG. 677 is a diagram showing an example of a message when transmitting information from a washlet and screen display information according to Embodiment J of the present invention.

Figure 678:
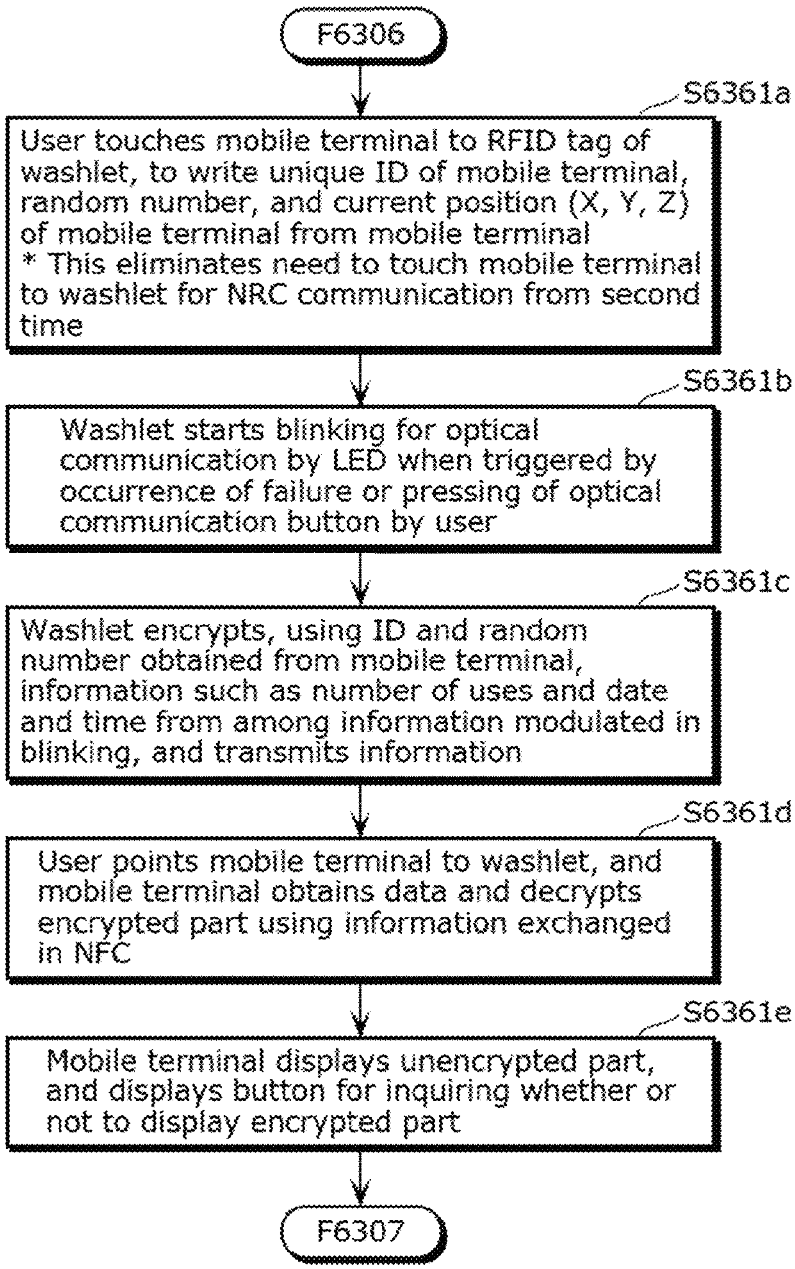

FIG. 678 is a flowchart showing process flow according to Embodiment J of the present invention.

FIG. 679 is a diagram showing a situation where the mobile terminal obtains information from the washlet during communication by NFC between the washlet and the mobile terminal and, for communication from the second time, uses optical communication based on the obtained information according to Embodiment J of the present invention.

Figure 680:
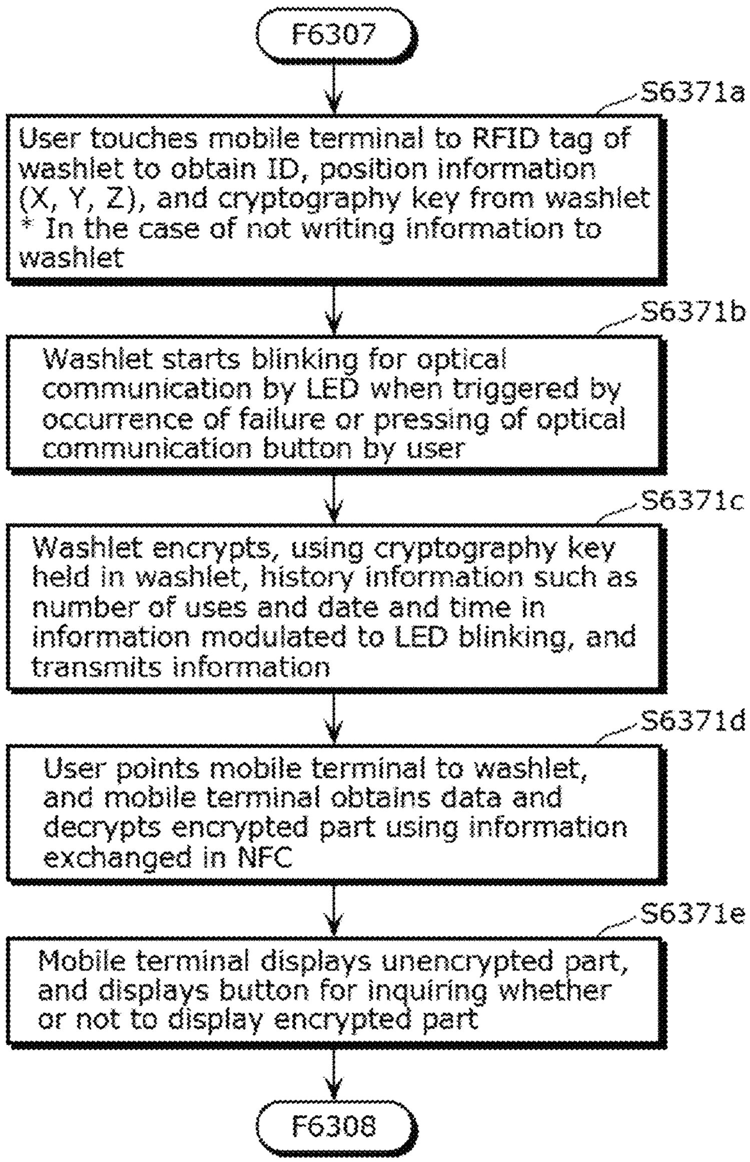

FIG. 680 is a flowchart showing process flow according to Embodiment J of the present invention.

Figure 681:
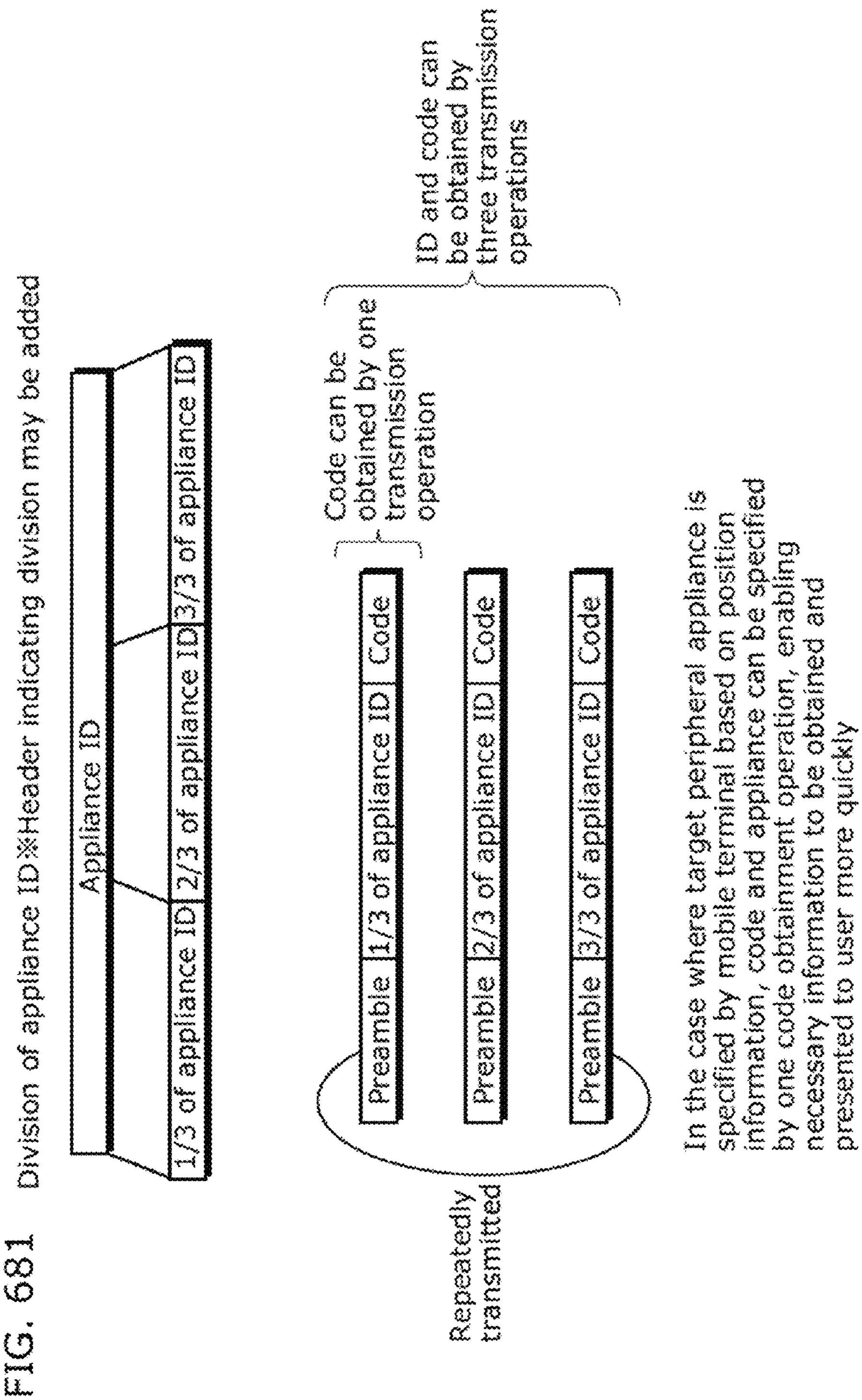

FIG. 681 is a diagram showing a method whereby an appliance ID is transmitted in segments to reduce a loss of time for receiving the appliance ID until important information such as an error code is obtained according to Embodiment J of the present invention.

Figure 682:
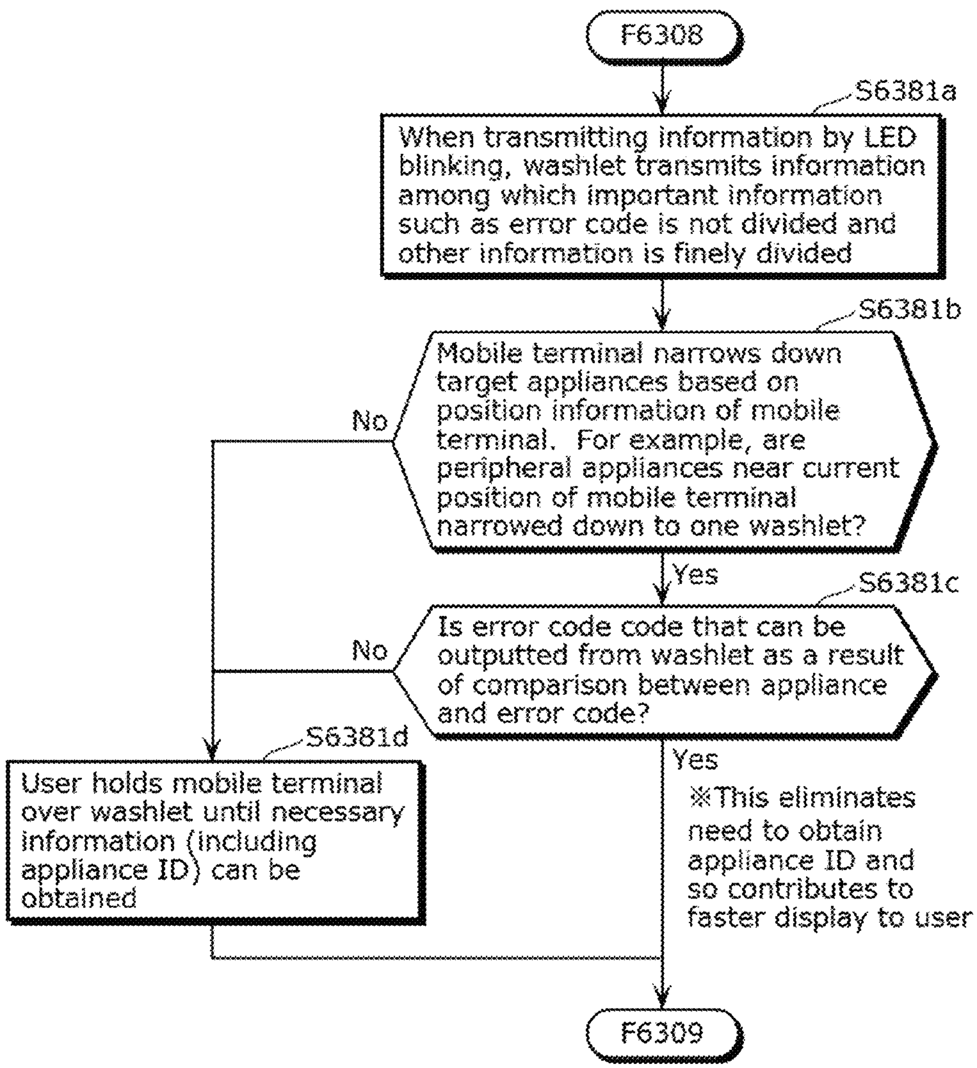

FIG. 682 is a flowchart showing process flow according to Embodiment J of the present invention.

Figure 683:
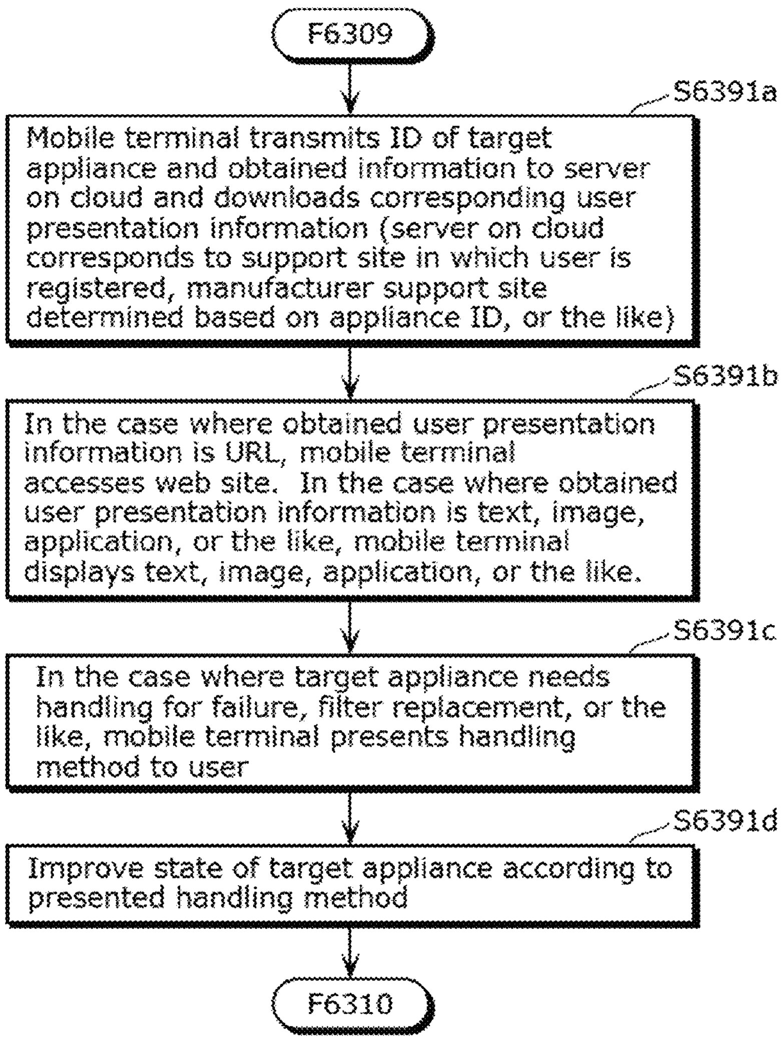

FIG. 683 is a flowchart showing process flow according to Embodiment J of the present invention.

Figure 684:
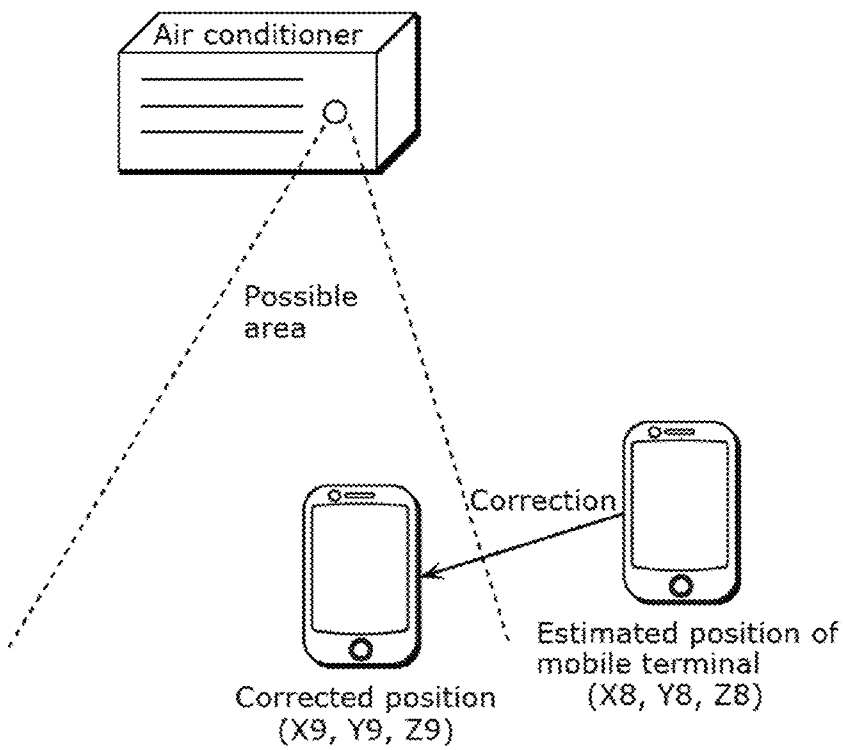

FIG. 684 is a diagram for describing a method of, in the case where the mobile terminal can obtain position information of a target appliance by optical communication, correcting position information of the mobile terminal estimated in the mobile terminal, based on the obtained position information.

Figure 685:
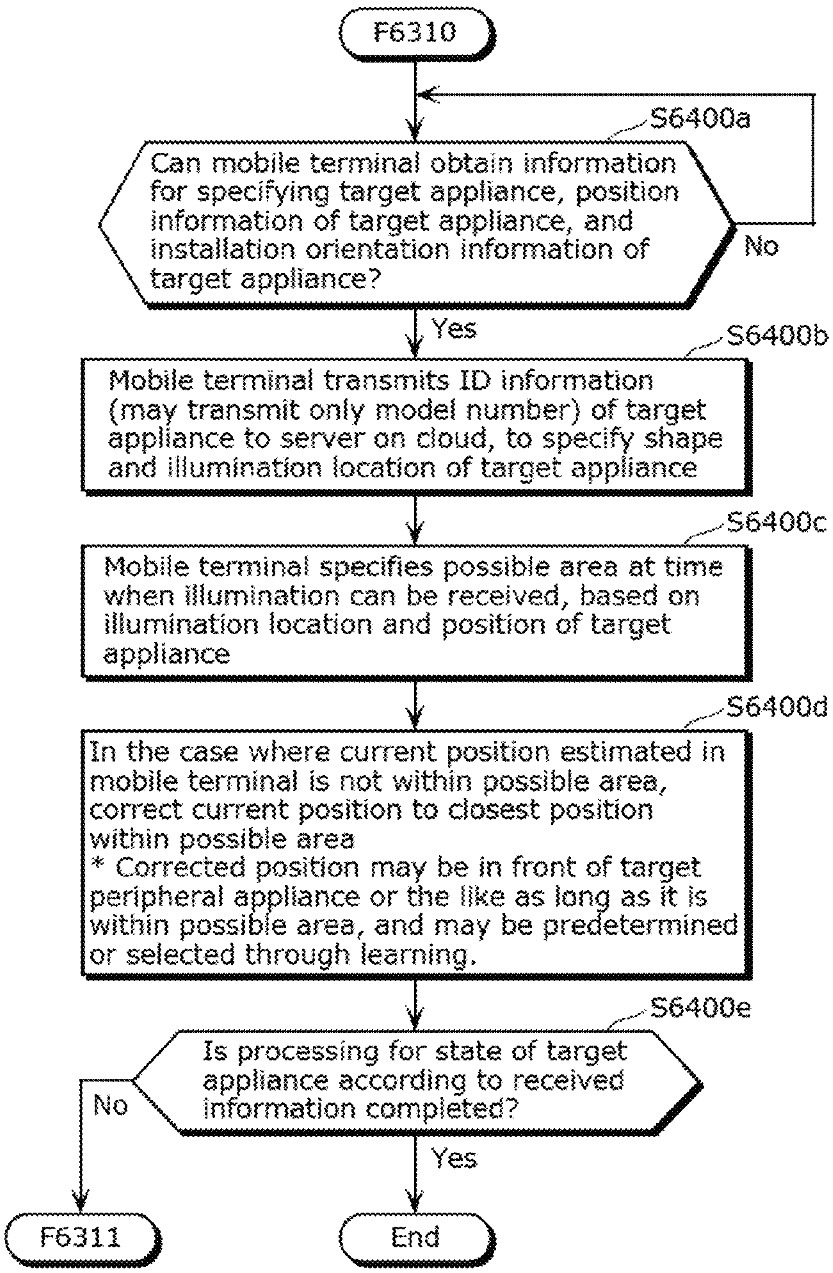

FIG. 685 is a flowchart showing process flow according to Embodiment J of the present invention.

Figure 686:
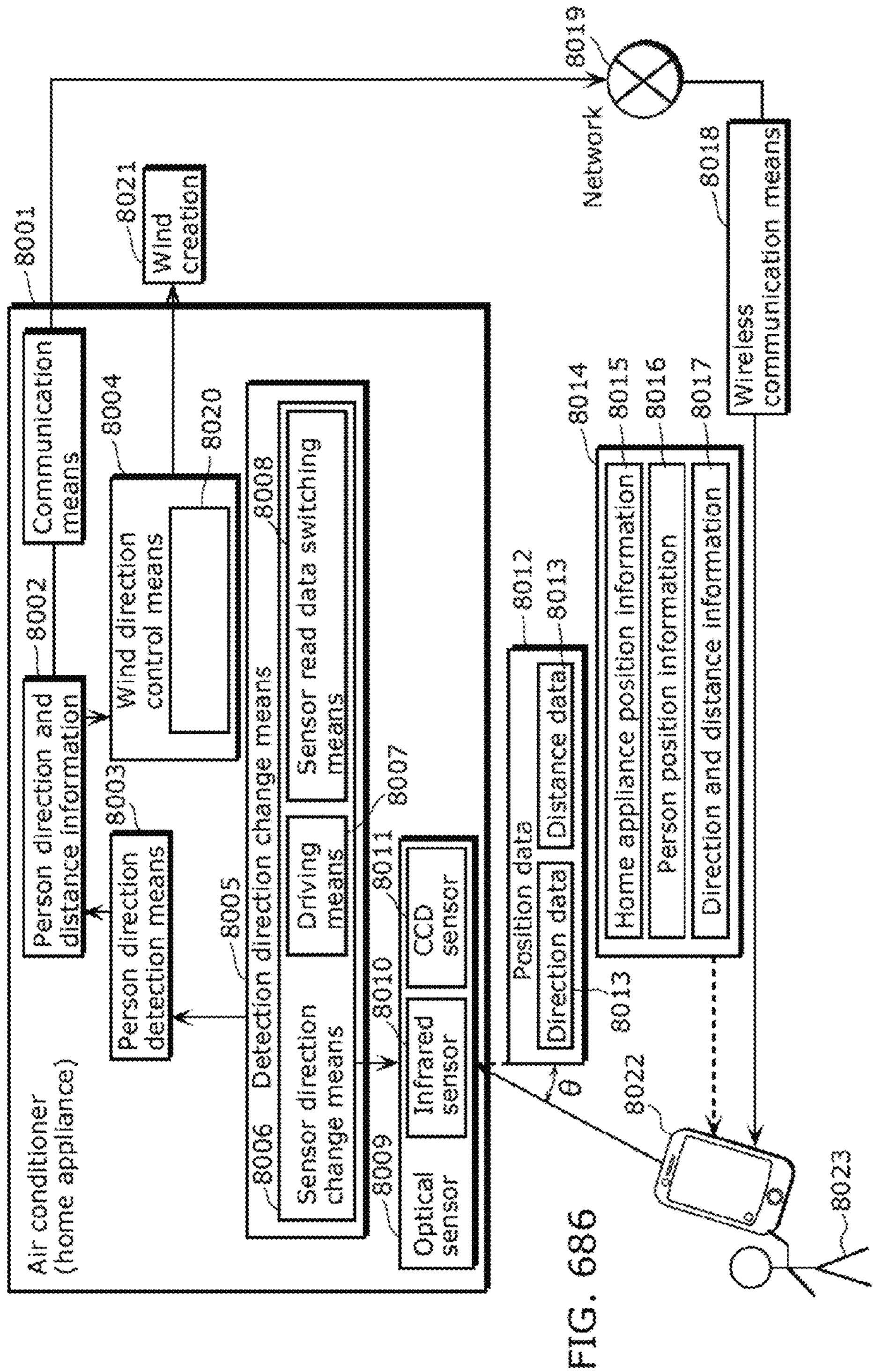

FIG. 686 is a diagram for describing a method of further correcting position information of the mobile terminal based on person position information obtainable by a home appliance.

Figure 687:
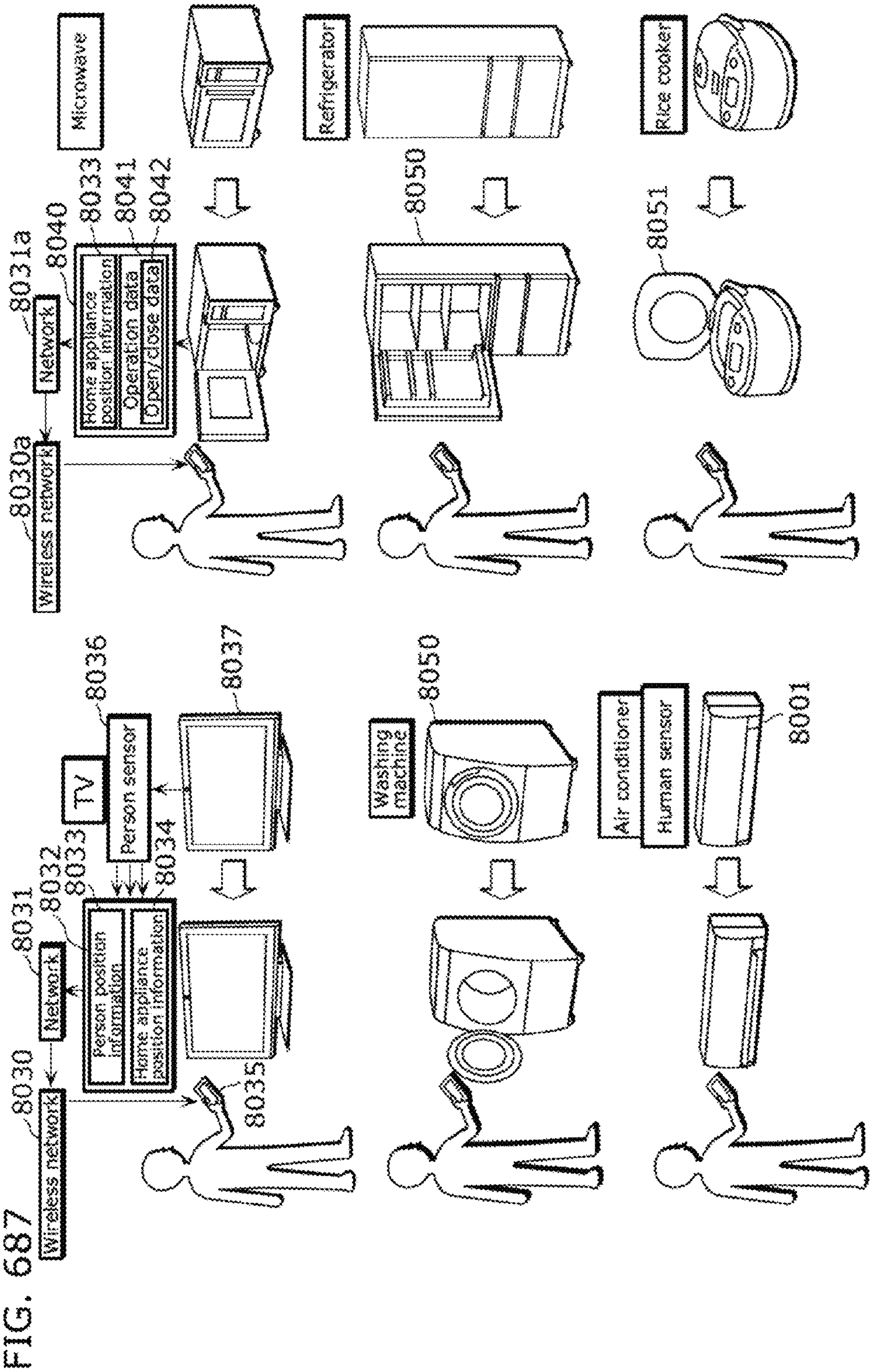

FIG. 687 is a diagram for describing a method of further correcting position information of the mobile terminal based on person position information obtainable by a home appliance.

DESCRIPTION OF EMBODIMENTS

The following describes embodiments according to the present invention with reference to the drawings. In the following embodiments, various aspects of the communication device according to the present invention are described.

[Embodiment 1]

Figure 1:
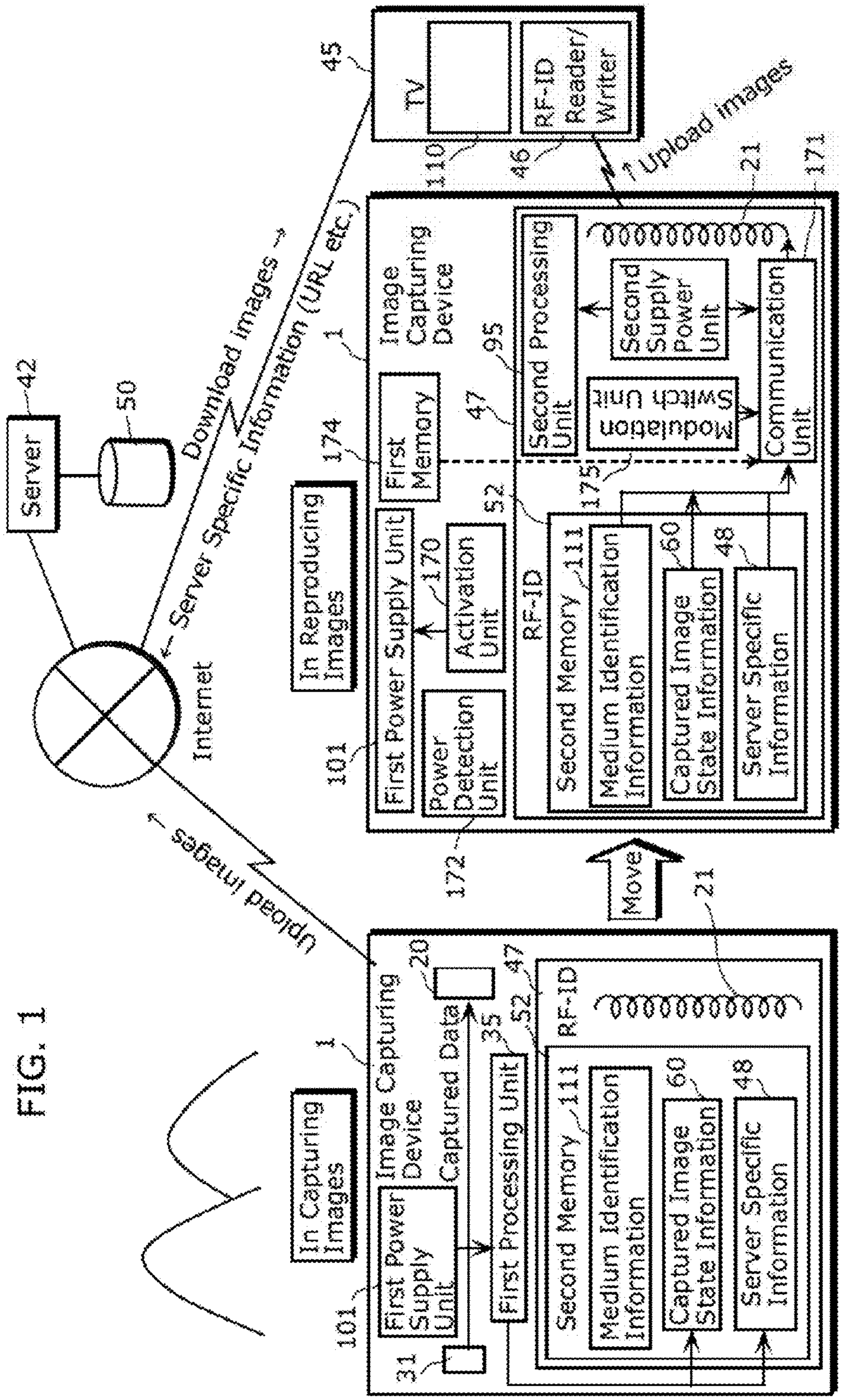
FIG. 1 illustrates an entire system of an image capturing device according to Embodiment 1 of the present invention.

Embodiment 1 according to the present invention is described below. FIG. 1 is a schematic diagram of Embodiment 1 of the present invention. Here, a communication system including an image capturing device (camera) 1, a TV 45, and a server 42 is illustrated. In FIG. 1, the image capturing device 1 capturing images is illustrated on a left-hand side, while the image capturing device 1 reproducing the captured images is illustrated on a right-hand side.

The image capturing device 1 is an example of the communication device according to the aspect of the present invention. Here, the image capturing device 1 is implemented as a digital camera. For units used in capturing images, the image capturing device 1 includes a first power supply unit 101, a video processing unit 31, a first antenna 20, a first processing unit 35, a second memory 52, and a RF-ID antenna (second antenna) 21. The second memory 52 holds medium identification information 111, captured image state information 60, and server specific information 48. The RF-ID antenna 21 is used for a RF-ID unit. For units used in reproducing images, the image capturing device 1 includes the first power supply unit 101, a first memory 174, a power detection unit 172, an activation unit 170, the second memory 52, a second processing unit 95, a modulation unit switch 179, a communication unit 171, a second power supply unit 91, and the RF-ID antenna 21. The second memory 52 holds the medium identification information 111, the captured image state information 60, and the server specific information 48.

The TV 45 is an example of an apparatus (device, appliance) connected to a reader via a communication path. In more detail, the TV 45 is a television receiving apparatus used to display image data captured by the image capturing device 1. The TV 45 includes a display unit 110 and a RF-ID reader/writer 46.

The server 42 is a computer that holds image data uploaded from the image capturing device 1 and that downloads the image data to the TV 45. The server 42 has a storage device in which data 50 is stored.

When images of objects such as scenery are captured, the images are converted to captured data (image data) by the video processing unit 31. Then, in communicable conditions, the image data is transmitted to an access point using the first antenna 20 for a wireless Local Area Network (LAN) or Worldwide Interoperability for Microwave Access (WiMAX), and eventually recorded as the data 50 via the Internet to the predetermined server 42.

Here, the first processing unit 35 records the captured image state information 60 regarding the captured image data onto the second memory 52 in a RF-ID unit 47. The captured image state information 60 indicates at least one of (a) date and time of capturing each of the images, (b) the number of the captured images, (c) date and time of finally transmitting (uploading) an image, (d) the number of transmitted (uploaded) images, and (e) date and time of finally capturing an image. In addition, the captured image state information 60 includes (f) serial numbers of images that have already been uploaded or images that have not yet been uploaded; (g) a serial number of a finally captured image; and the like.

In addition, the first processing unit 35 generates a Uniform Resource Locator (URL) of the data 50 that is uploaded to the server 42. The first processing unit 35 records the server specific information 48 onto the second memory 52. The server specific information 48 is used to access the image data. The medium identification information 111 is also recorded on the second memory 52. The medium identification information 111 is used to determine whether the device embedded with the RF-ID (RF-ID unit) is a camera, a card, or a post card.

When a main power of the camera (the first power supply unit 101 such as a battery) is ON, the second memory 52 receives power from the main power. Even if the main power of the camera is OFF, the external RF-ID reader/writer located outside supplies power to the RF-ID antenna 21. This enables the passive second power supply unit 91 without any power like a battery to adjust a voltage to provide power to respective units in a RF-ID circuit unit including the second memory. Thereby, it is possible to supply power to the second memory 52 so that the data is exchanged between the second memory 52 and the external device to be recorded and reproduced. Here, the second power supply unit 91 is a circuit generating power from radio waves received by the second antenna (RF-ID antenna) 21. The second power supply unit 91 includes a rectifier circuit and the like. Whenever the main power is ON or OFF, the data in the second memory 52 is read and written by the second processing unit 95. When the main power is ON, the data in the second memory 52 can be read and written also by the first processing unit 35. In other words, the second memory 52 is implemented as a nonvolatile memory, and both the first processing unit 35 and the second processing unit 95 can read and write data from and to the second memory 52.

When the image capturing device 1 completes capturing images of a trip or the like and then the captured images are to be reproduced, the image capturing device 1 is moved into proximity of the RF-ID reader/writer 46 of the TV 45, as illustrated on the right side of FIG. 1 as being the situation of reproducing images. Then, the RF-ID reader/writer 46 supplies power to the RF-ID unit 47 via the second antenna 21, and thereby the second power supply unit 91 provides power to the units in the RF-ID unit 47, even if the main power (the first power supply unit 101) of the image capturing device 1 is OFF. The captured image state information 60 and the server specific information 48 are read by the second processing unit 95 from the second memory 52, and transmitted to the TV 45 via the second antenna 21. The TV 45 generates a URL based on the server specific information 48, then downloads the image data of the data 50 from the server 42, and eventually displays, on the display unit 110, thumbnails or the like of images in the image data. If it is determined based on the captured image state information 60 that there is any captured image not yet uploaded to the server 42, the determination result is displayed on the display unit 110. If necessary, the image capturing device 1 is activated to upload, to the server 42, image data of the captured image not yet uploaded.

Figure 2:
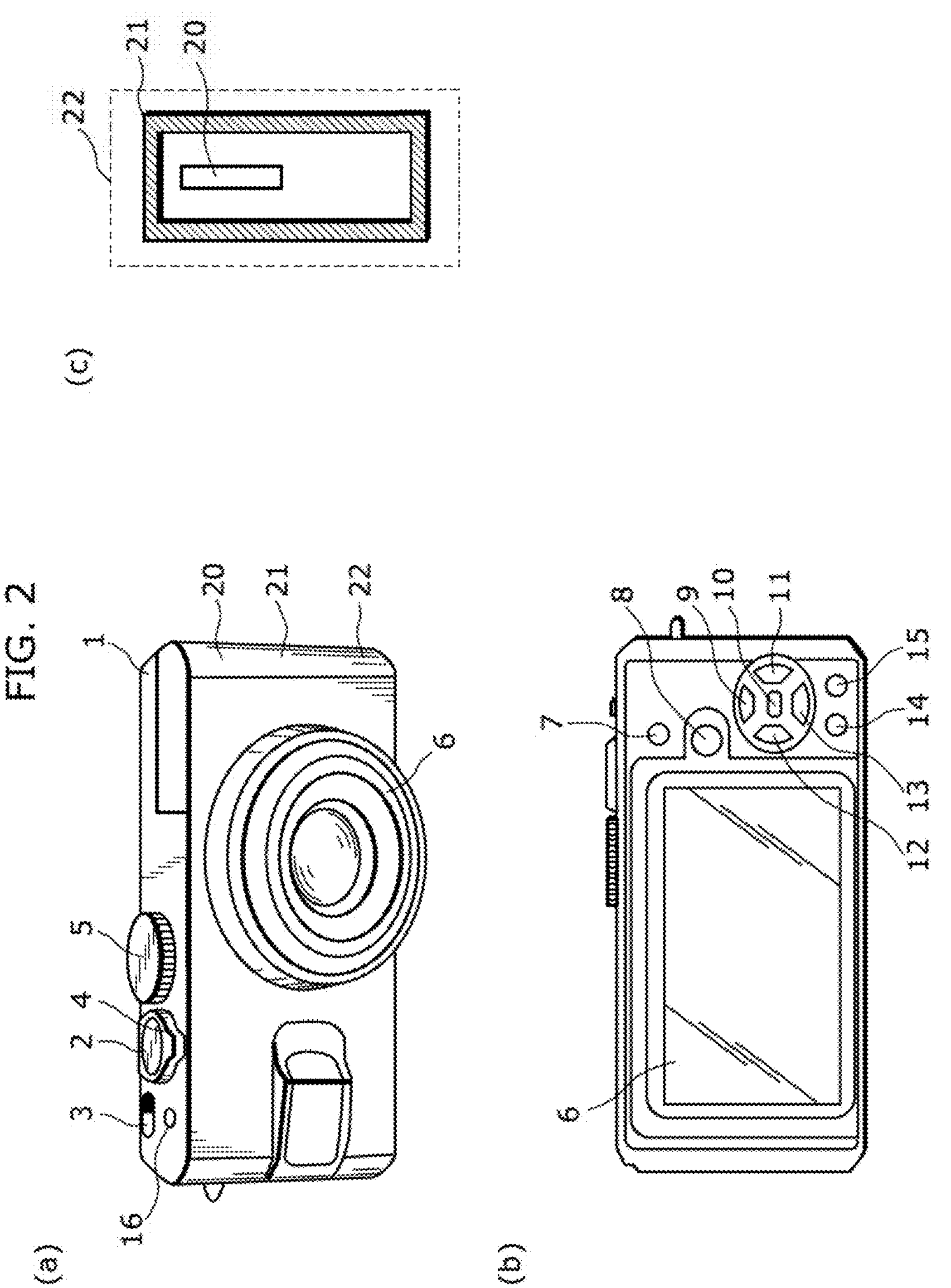
FIG. 2 is an external view of the image capturing device according to Embodiment 1 of the present invention.

(a), (b), and (c) in FIG. 2 are an external front view, an external back view, and an external right side view, respectively, of the image capturing device 1 according to Embodiment 1 of the present invention.

As illustrated in (c) in FIG. 2, the first antenna 20 used for a wireless LAN and the second antenna 21 used for the RF-ID unit are embedded in a right side of the image capturing device 1. The antennas are covered with an antenna cover 22 made of a material not shielding radio waves. The RF-ID unit operates at a frequency of 13.5 MHz, while the wireless LAN operates at a frequency of 2.5 GHz. The significant difference in frequency prevents interference between them. Therefore, the two antennas 20 and 21 are seen overlapping with each other from the outside, as illustrated in (c) in FIG. 2. The structure decreases an installation area of the antennas, eventually reducing a size of the image capturing device 1. The structure also enables the single antenna cover 22 to cover both of the two antennas as illustrated in (c) in FIG. 2, so that the part made of the material not shielding radio waves is minimized. The material not shielding radio waves, such as plastic, has a strength lower than that of a metal. Therefore, the minimization of the material can reduce a decrease in a strength of a body of the image capturing device 1. The image capturing device 1 further includes a lens 6 and a power switch 3. The units assigned with numeral references 2 to 16 will be described later.

Figure 3:
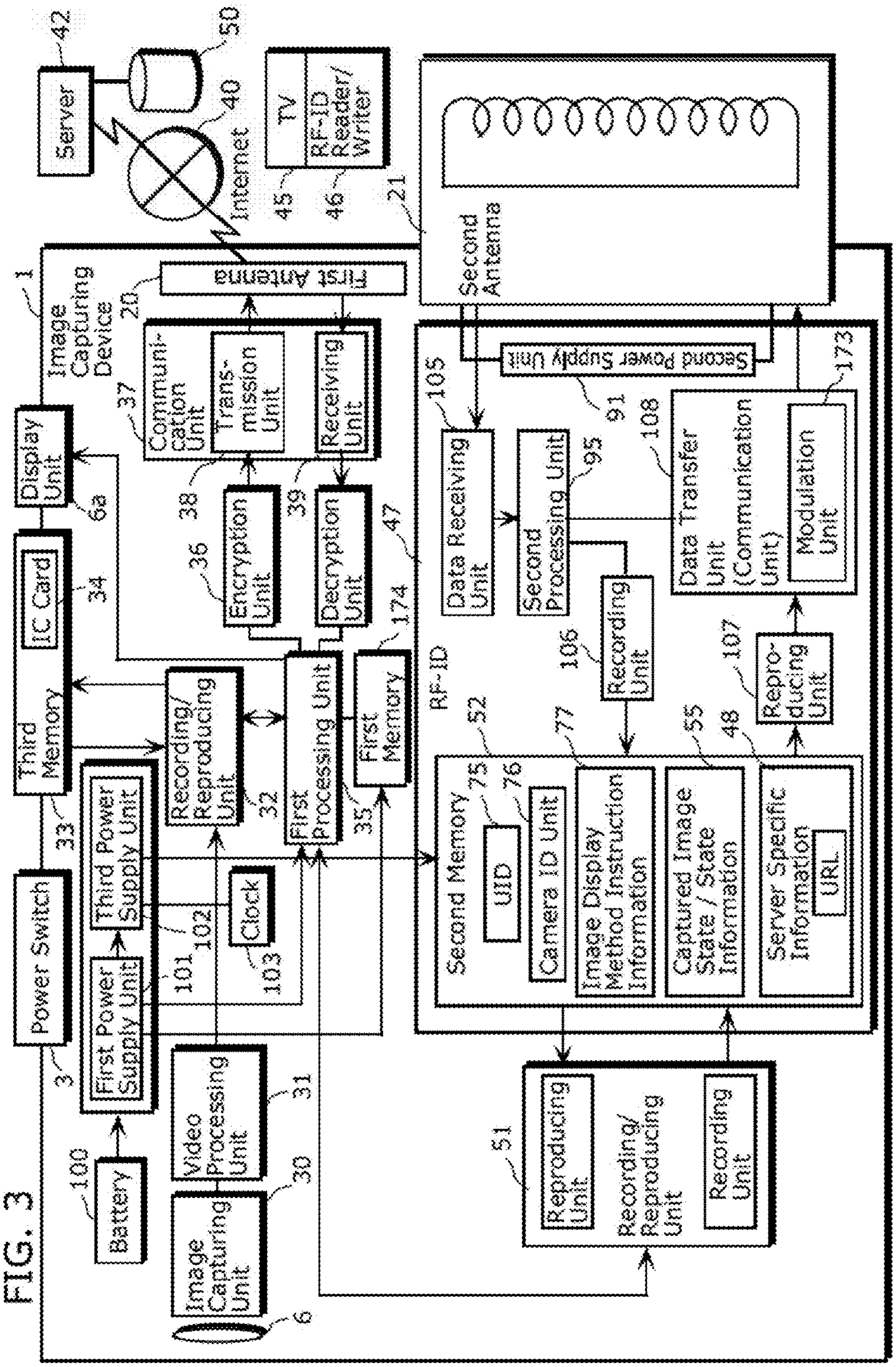
FIG. 3 is a block diagram of the image capturing device according to Embodiment 1 of the present invention.

FIG. 3 is a detailed block diagram of the image capturing device 1.

Image data captured by an image capturing unit 30 is provided to a recording/reproducing unit 32 via the video processing unit 31 and then recorded onto a third memory 33. The image data is eventually recorded onto an Integrated Circuit (IC) card 34 that is removable from the image capturing device 1.

The above processing is instructed by the first processing unit 35 that is, for example, a Central Processing Unit (CPU). The image data, such as captured photographs or video, is provided to an encryption unit 36, a transmission unit 38 in a communication unit 37, and then the first antenna 20, in order to be transmitted to an access point or the like by radio via a wireless LAN, WiMAX, or the like. From the access point or the like, the image data is transmitted to the server 42 via the Internet 40. In the above manner, the image data such as photographs is uploaded.

There is a situation where a part of the image data fails to be uploaded because, for example, the communication state is not good or there is no nearby access point or base station. In the situation, some images have already been uploaded to the server 42, and the other images have not yet been uploaded. Therefore, the image data in the server 42 is different from the image data captured by the image capturing device 1. In Embodiment 1 of the present invention, the RF-ID reader/writer 46 of the TV 45 or the like reads the server specific information 48 and the like from the second memory 52 in the RF-ID unit 47 of the image capturing device 1. Then, based on the readout information, a URL or the like of the server 42 is generated. According to the URL, the TV 45 accesses the server 42 to access the data 50 such as a file, folder, or the like uploaded by the image capturing device 1. Then, the TV 45 downloads the uploaded images from among the images captured by the image capturing device 1, and displays the downloaded images. The above method will be described in more detail later.

If a part or all of the captured images is not uploaded as image data of the data 50 in the server 42, a problem would occur that a user downloading the images to the TV 45 cannot watch a part of the images on the TV 45.

In order to solve the problem, in Embodiment 1 of the present invention, the first processing unit 35 causes a recording/reproducing unit 51 to indicate information regarding a state of captured images, such as information of uploading state, to the captured image state information 55 in the second memory 52.

The above is described in more detail with reference to FIG. 4. In the second memory 52, synchronization information 56 is recorded. The synchronization information 56 indicates whether or not image data in the server 42 matches image data captured by the camera, in other words, whether or not the image data in the server 42 is in synchronization with the image data captured by the camera. In Embodiment 1 of the present invention, the TV 45 reads the captured image state information 55 from the second memory 52 via the second antenna 21. The captured image state information 55 makes it possible to instantly determine whether or not the data 50 in the server lacks any image. If the determination is made that there is any image that has not yet been uploaded, then the determination result is displayed on the display unit of the TV 45. Here, the TV 45 also displays a message of "Please upload images" to a viewer. Or, the TV 45 issues an instruction to the camera via the RF-ID antenna 21 to transmit an activation signal to the activation unit 170, thereby supplying power to the first power supply unit 101 of the image capturing device 1. Thereby, the TV 45 causes the image capturing device 1 to upload, to the server 42, the images in the first memory 174 or the like of the image capturing device 1, which have not yet been uploaded, via a wireless LAN, a wired LAN, the second antenna (RF-ID antenna) 21, or the like.

Since transmission via the RF-ID antenna 21 has a small transfer amount, transmission of the image data as originally captured takes a considerable time to upload and display the image data. This causes a user to feel unpleasant. In order to avoid this, according to Embodiment 1 of the present invention, when the image data is transmitted via the RF-ID antenna 21, thumbnails of the images not yet uploaded are transmitted instead. The thumbnails can shorten apparent upload time and display time, suppressing unpleasant feeling of the user. Most of current RF-ID of a HF band has a transfer amount of several hundreds kbps. However, development of RF-ID having a quad-speed has been examined. The quad-speed RF-ID has a possibility of achieving a transfer amount of several Mbps. If thumbnails of images not yet uploaded are transmitted, it is possible to transmit several dozens of thumbnails in one second. If thumbnails are displayed in a list, thumbnails of all images including images not yet uploaded can be displayed on the TV within a time period a general user can tolerate. The above is one of practical solutions.

If the image capturing device is forced to be activated to upload images not yet uploaded as described above, the most speedy and stable path is selected from a wireless LAN, the RF-ID antenna 21, and a wired LAN, to be used for uploading and displaying on the TV. In the situation where the image capturing device 1 receives power from the outside via the second antenna 21, the communication unit 171 transmitting signals to the second antenna 21 performs communication with the outside by a low-speed modulation method. On the other hand, in the situation where the image capturing device 1 can receive power from the first power supply unit 101 or the like, the communication unit 171 switches the modulation method to a modulation method having a large signal point, such as Quadrature Phase Shift Keying (QPSK), 16-Quadrature Amplitude Modulation (QAM), or 64-QAM, as needed, in order to achieve high-speed transfer to upload the image data not yet uploaded in a short time. Furthermore, when the power detection unit 172 detects, for example, that the first power supply unit 101 or the like does not have enough power or that the image capturing device 1 is not connected to an external power, the first power supply unit 101 stops supplying power and a modulation switch unit 175 switches the modulation method employed by the communication unit 171 to a modulation method having a smaller signal point or less transfer rate. As a result, it is possible to prevent that the capacity of the first power supply unit 101 is reduced to be equal to or less than a set value.

There is another solution for power. When power is not enough, the second processing unit 95, the communication unit 171, or the like sends a power increase request signal to the RF-ID reader/writer 46 of the TV 45 via the second antenna 21, to request for power support. In response to the request, the RF-ID reader/writer 46 increases providing power to have a value greater than the set value for the power used in reading data from the RF-ID unit. Since the RF-ID unit receives more power via the second antenna 21, the RF-ID unit can provide power to the communication unit 171 or the first processing unit 35. Thereby, a power amount of a battery 100 for the first power supply unit 101 is not reduced. Or, without the battery 100, the image capturing device 1 can practically and unlimitedly continue transmission.

As still another method, uploaded-image-data information 60 in FIG. 3 can be used. In uploaded-image-data information 60, uploaded-image information 61 such as serial numbers of photographs, is recorded. It is also possible to use hashed information 62 generated by hashing the information 61. As a result, a data amount is reduced.

The TV 45 can read the above information to be compared to information of images captured by the camera, thereby obtaining information of images not yet uploaded.

As still another method, not-yet-uploaded image data existence identification information 63 can be used. The not-yet-uploaded image data existence identification information 63 includes an existence identifier 64 indicating whether or not there is any image not yet uploaded. Since existence of images has not yet been uploaded is notified, data in the second memory 52 can be significantly reduced.

It is also possible to use not-yet-uploaded-image number 65 indicating the number of images not yet uploaded. Since the image capturing device 1 allows the TV 45 to read the information, a viewer can be informed of the number of images to be uploaded. In this case, a data capacity in addition to the number is recorded as the captured image state information 55. Thereby, the image capturing device 1 enables the TV 45 to display a more exact prediction time required to upload images not yet uploaded.

It is also possible to use not-yet-uploaded image information hashed information 67 that is generated by hashing information regarding images not yet uploaded.

In addition, it is also possible to record a final capturing time (final capturing date/time) 68 in the second memory 52. Later, the TV 45 reads the final capturing time 68. The TV 45 is connected to the server 42 to compare the final capturing time 68 to a capturing date of an image that has been finally uploaded to the server 42. Thereby, it is possible to easily determine whether or not there is any image not yet uploaded. If images are captured and assigned with serial numbers sequentially from an older image, it is possible to record only a final image serial number 69. The final image serial number 69 is compared to a serial number of an image that has been finally uploaded to the server 42. Thereby, it is possible to determine whether or not there is any image not yet uploaded. It is also possible to record, onto the second memory 52, captured image information 70 that is, for example, serial numbers of all captured images. Thereby, the TV 45 later accesses the server 42 to match the serial numbers to images uploaded to the server 42. As a result, it is possible to determine whether or not there is any image not yet uploaded. When the captured image information 70 is used, use of hashed information 71 generated by hashing the captured image information 70 can compress the captured image information 70.

Figure 22:
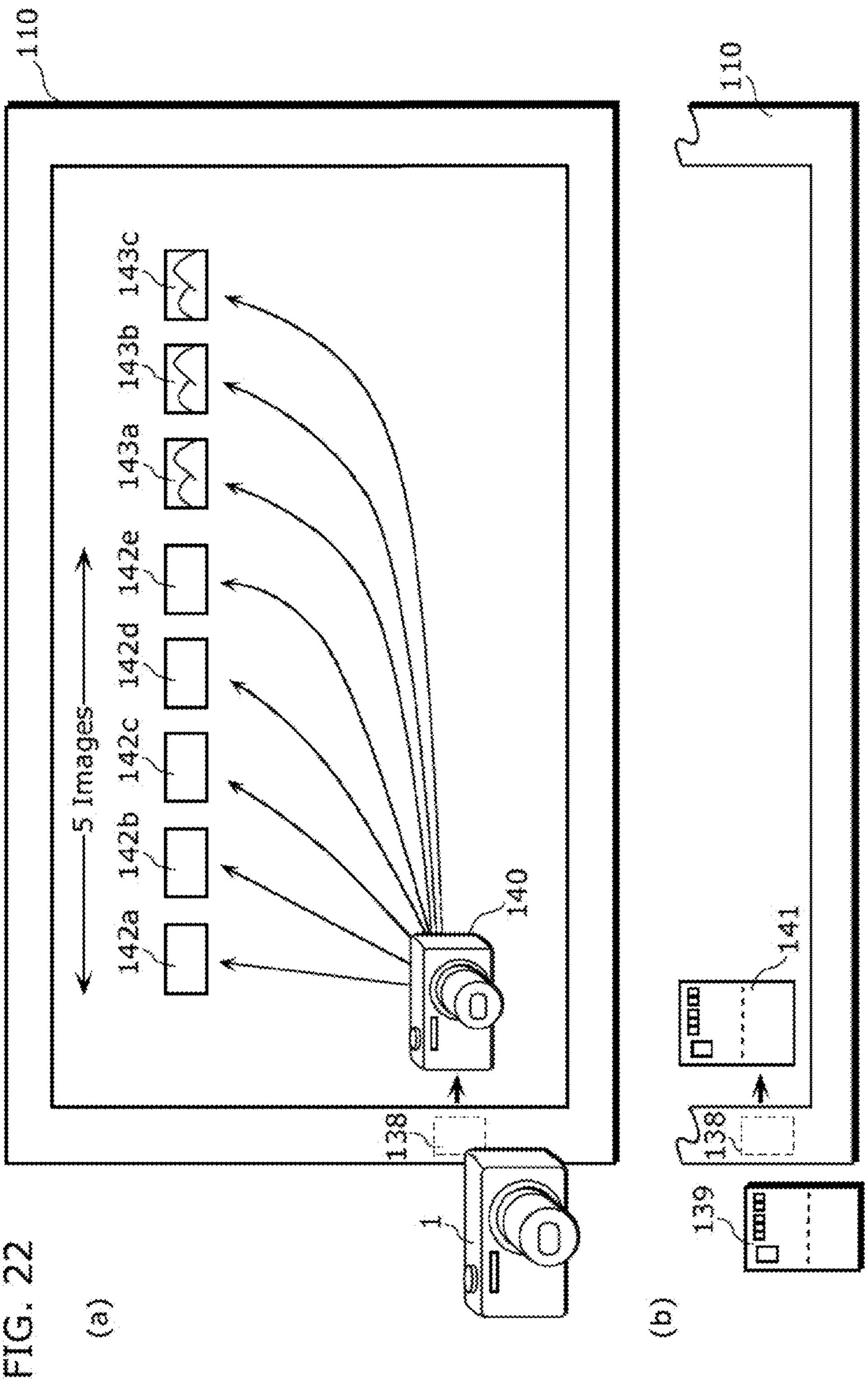
FIG. 22 is a diagram presenting a display method of the image capturing device and the TV, according to Embodiment 1 of the present invention.

The second memory 52 further stores Unique IDentification (UID) 75 of the RF-ID unit, camera ID 76, and the medium identification information 111. Even if the main power of the camera (except a sub-power for backup etc. of a clock) is OFF, these pieces of information can be read by the TV 45 via the second antenna 21 to be used for identifying the camera or the user or authenticating a device (apparatus). When the user comes back from an overseas trip or the like, the camera is likely to have a small charge amount of the battery. However, according to Embodiment 1 of the present invention, the camera can be operated to transmit information without battery, which is highly convenient for the user. The medium identification information 111 includes an identifier or the like indicating whether the medium or device embedded with the RF-ID unit is a camera, a camcorder, a post card, a card, or a mobile phone. The identifier enables the TV 45 to identify the medium or device. Thereby, the TV 45 can display a mark or icon of the camera or postcard on a screen as illustrated in FIG. 22, as will be described. The TV 45 can also change processing depending on the identifier.

Figure 5:
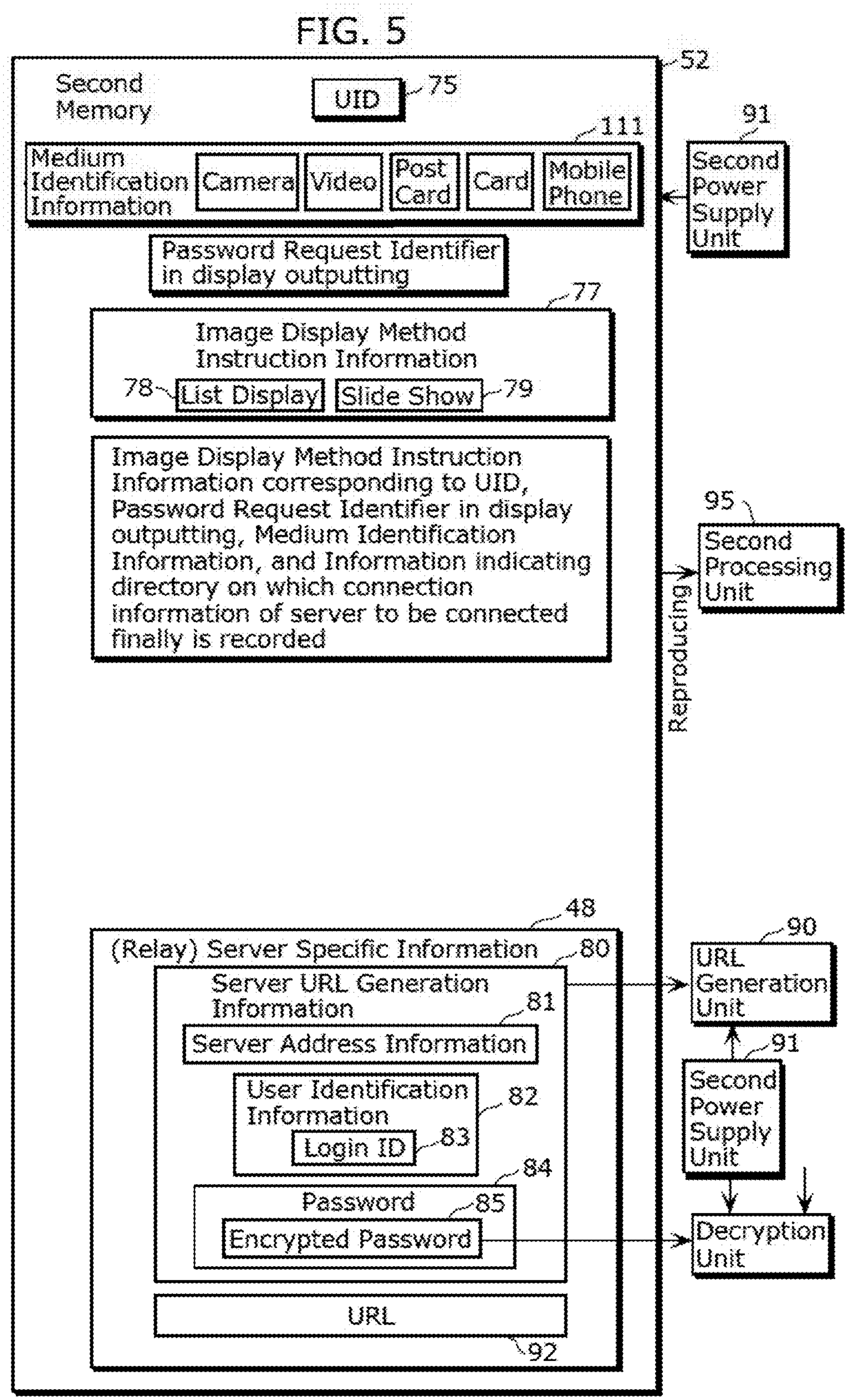
FIG. 5 is a block diagram of the second memory in the image capturing device according to Embodiment 1 of the present invention.

The second memory 52 also stores image display method instruction information 77. For example, in the situation where a list display 78 in FIG. 5 is selected, when the second antenna 21 is moved into proximity of the RF-ID reader/writer 46 of the TV 45, the image capturing device 1 (camera) causes the TV 45 to display a list of thumbnails of images, such as photographs.

In the situation where slide show 79 is selected, the image capturing device 1 causes the TV 45 to sequentially display images from a newer one or an older one.

Figure 4:
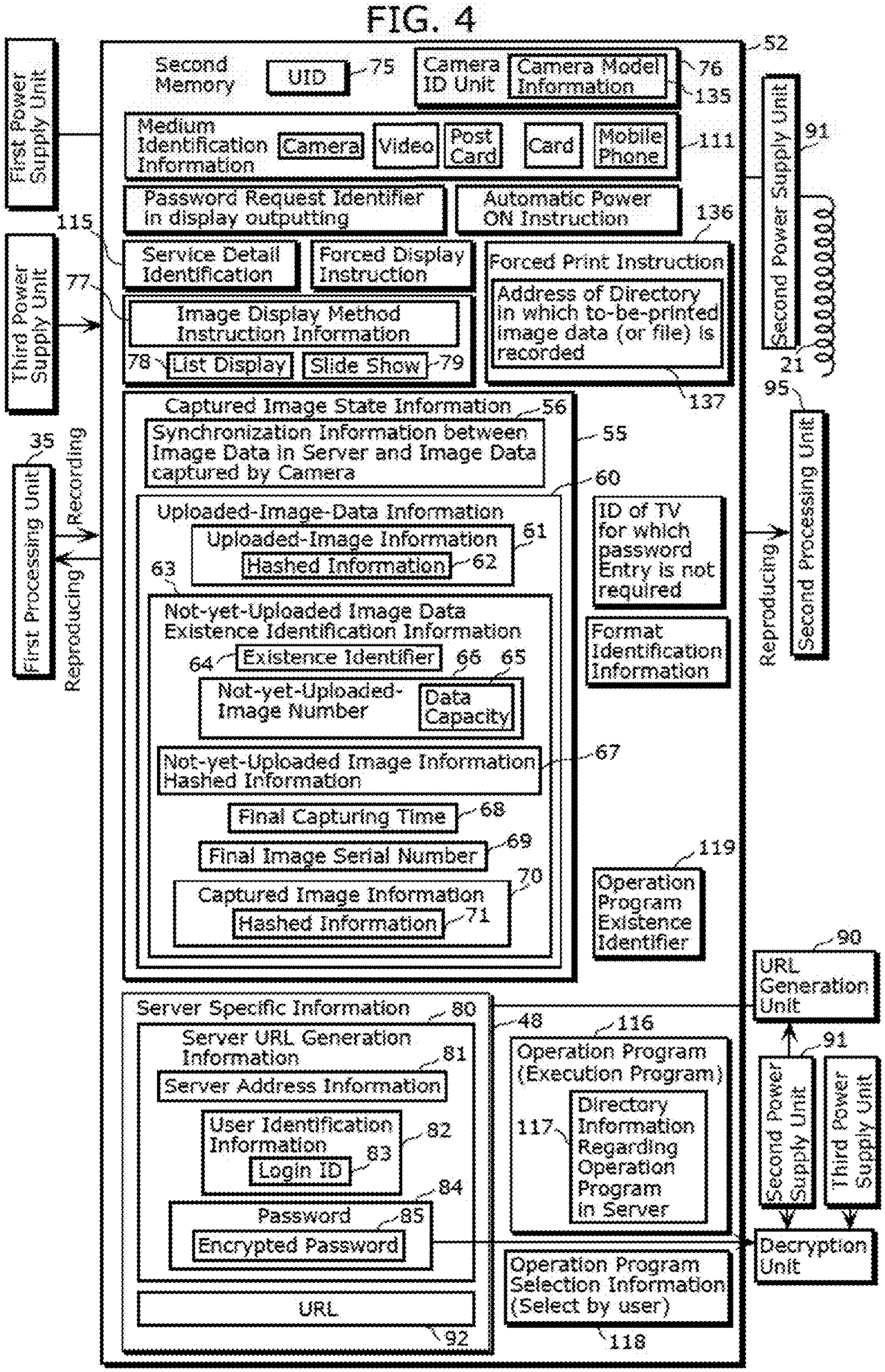
FIG. 4 is a block diagram of a second memory in the image capturing device according to Embodiment 1 of the present invention.

In a lower part of the second memory 52 in FIG. 4, there is a region for recording the server specific information 48.

The server specific information 48 allows a camera operator to display images on the TV screen by a preferred method.

The server specific information 48 includes server URL generation information 80 that is source information from which a server URL is generated. An example of the server URL generation information 80 is login ID 83. The server specific information 48 has a region in which server address information 81 and user identification information 82 are recorded. In practice, login ID 83 and the like are recorded. In addition, there is a region for storing a password 84. An encrypted password 85 may be stored in the region. The above pieces of information are used to generate a URL by a URL generation unit 90 that is provided in the image capturing device 1, the RF-ID unit 47, the camera function used for capturing images in the image capturing device 1, or the TV 45. The URL is used for accessing a group of images corresponding to the image capturing device 1 or the user in the server 42. If the URL generation unit 90 is provided in the RF-ID unit 47, the URL generation unit 90 receives power from the second power supply unit 91.

It is also possible to generate URL 92 without using the above pieces of information and store the generated URL 92 directly to the second memory 52.

It is characterized in that the above-described pieces of information stored in the second memory 52 can be read by both the second processing unit 95 in the RF-ID unit and the first processing unit 35 in the camera function.

The above structure allows the TV 45 reading the RF-ID unit 47 in the camera to instantly obtain the pieces of information regarding uploading state, the sever address information, the login ID, the password, and the like. Thereby, the TV 45 can download image data corresponding to the camera from the server 42, and display the image data at a high speed.

In the above situation, even if the main power of the image capturing device 1 is OFF, the RF-ID reader/writer supplies power to the second power supply unit 91 to activate (operate) the image capturing device 1. Therefore, power of the battery 100 in the image capturing device 1 is not reduced.

Referring back to FIG. 3, the first power supply unit 101 receives power from the battery 100 to provide power to the units in the camera. In a quiescent state, however, a third power supply unit 102 provides weak power to the clock 103 and the like. In some cases, the third power supply unit 102 supplies backup power to a part of the second memory 52.

The RF-ID unit 47 receives power from the second antenna to provide power to the second power supply unit 91, thereby operating the second processing unit 95, or operating a data receiving unit 105, a recording unit 106, a reproducing unit 107, a data transfer unit 108 (the communication unit 171), and the second memory 52.

Therefore, in a quiescent state of the camera, no power is consumed. As a result, it is possible to keep the battery 100 of the camera longer.

The processing performed by the image capturing device 1 (referred to also as a "medium" such as a camera or card) and the processing performed by the TV and the RF-ID reader/writer are explained with reference to a flowchart of FIG. 7.

Figure 7:
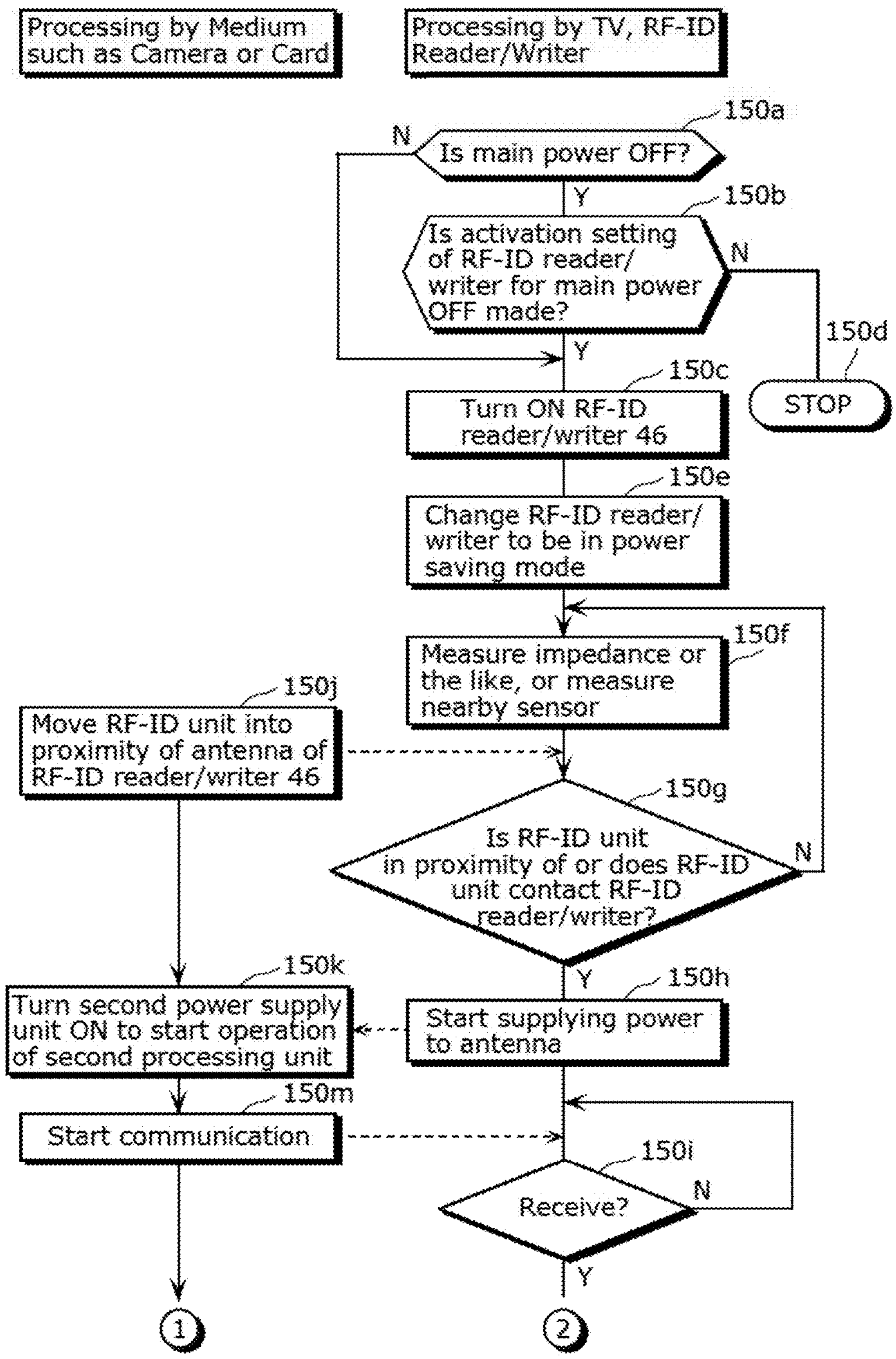
FIG. 7 is a flowchart of processing performed by the image capturing device and a TV, according to Embodiment 1 of the present invention.

If the main power is OFF in Step 150*a* in FIG. 7, it is determined in Step 150*b* whether or not activation setting of the RF-ID reader/writer for the main power OFF is made. If the activation setting is made, then the RF-ID reader/writer 46 is turned ON in Step 150*c* and changed to be in a power saving mode in Step 150*e*.

In Step 150*f*, impedance or the like of an antenna unit is measured, or a nearby sensor is measured. When the RF-ID unit is moved into proximity of an antenna of the RF-ID reader/writer 46 in Step 150*j*, it is detected in Step 150*g* whether or not the RF-ID unit is in proximity of or contacts the antenna. If it is detected that the RF-ID unit is in proximity of or contacts the antenna, then the RF-ID reader/writer 46 starts supplying power to the antenna of the medium in Step 150*h*. In Step 150*k*, in the medium, the second power supply unit is turned ON and thereby the second processing unit starts operating. As Step 150*m*, communication between the medium (camera or card) and the RF-ID reader/writer 46 starts.

In Step 150*i*, the TV determines whether or not the RF-ID reader/writer 46 receives communication from the medium. If the RF-ID reader/writer 46 receives communication, then mutual authentication starts in Steps 151*a* and 151*f* in FIG. 8. If it is determined in Steps 151*b* and 151*g* that the mutual authentication is successful, information is read out from the second memory in Step 151*d*. In Step 151*e*, the readout information is transmitted to the RF-ID reader/writer 46. In Step 151*i*, the RF-ID reader/writer 46 receives the information. In Step 151*j*, the TV 45 side makes a determination as to whether or not the identification information or the like of the second memory is correct. If the identification information or the like is correct, then it is determined in Step 151*p* whether or not the TV 45 has identification information indicating automatic power ON. If the TV 45 has identification information, then it is determined in Step 151*r* whether or not a main power of the TV is OFF. If the main power of the TV is OFF, the main power of the TV is turned ON in Step 152*a* of FIG. 9. In Step 152*b*, the TV 45 side makes a determination as to whether or not the second memory 52 has forced display instruction. If the second memory 52 has the forced display instruction, then the TV 45 side changes an input signal of the TV to a screen display signal for displaying the RF-ID in Step 152*d*. In Step 152*e*, the RF-ID reader/writer 46 reads format identification information. In Step 152*f*, the RF-ID reader/writer 46 reads information from the second memory by changing a format of the information to a format according to the format identification information. In Step 152*g*, the TV 45 side makes a determination as to whether or not the second memory has a "password request flag". If the second memory has the "password request flag", then the RF-ID reader/writer 46 reads an "ID of TV not requesting password entry" from the second memory in Step 152*h*. In Step 152*i*, the TV 45 side makes a determination as to whether or not ID of the TV 45 matches the "ID of TV not requesting password entry". If the ID of the TV 45 does not match the "ID of TV not requesting password entry", then the medium reads out a password from the second memory in Step 152*q*. In Step 152*v*, the medium decrypts the password that has been encrypted. In Step 152*s*, the medium transmits the decrypted password to the TV 45 side. Here, in Steps 152*q*, 152*r*, and 152*s*, it is also possible to store the password in a storage device in the server 42 as the data 50 in the server 42.

In Step 152*j*, the RF-ID reader/writer 46 receives the password. In Step 152*k*, the TV 45 displays a password entry screen. In Step 152*m*, the TV 45 determines whether or not the input password is correct. The determination may be made by the server 42. If the determination is made that the input password is correct, then the TV 45 performs display based on the information and program read from the second memory in the RF-ID unit in Step 152*p*.

Figure 10:
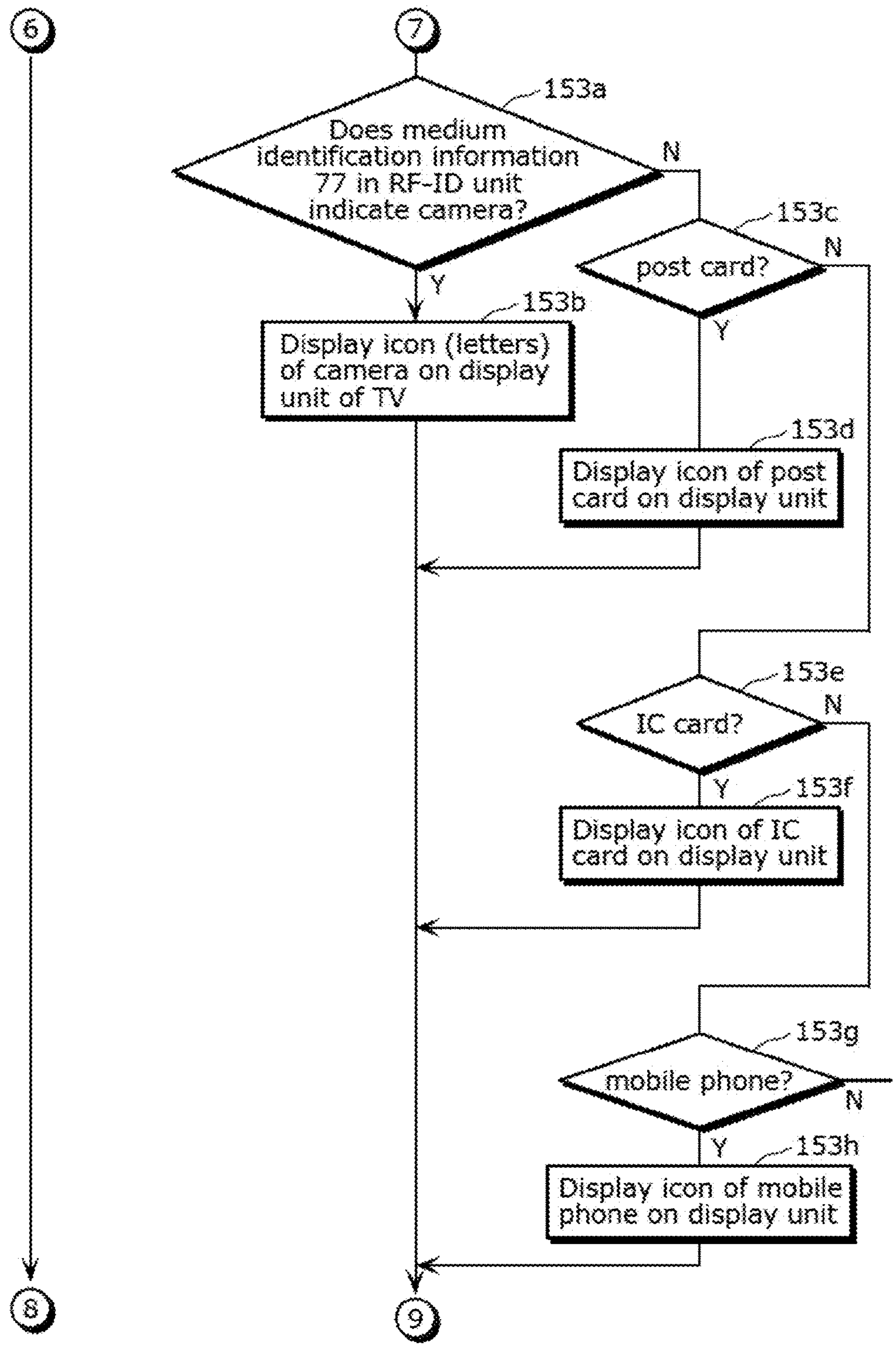
FIG. 10 is a flowchart of the processing performed by the image capturing device and the TV, according to Embodiment 1 of the present invention.

In Step 153*a* of FIG. 10, the TV 45 side determines whether or not the medium identification information 111 in the RF-ID unit in the second memory indicates that the medium is a camera. If the medium identification information 111 indicates a camera, then the TV 45 displays an icon (characters) of a camera (camera icon) on the display unit in Step 153*b*. On the other hand, if the medium identification information 111 does not indicate a camera, then it is determined in Step 153*c* whether or not the medium identification information 111 indicates a post card. If the medium identification information 111 indicates a post card, then the TV 45 displays an icon of a post card (post-card icon) in Step 153*d*. On the other hand, if the medium identification information 111 does not indicate a post card, the TV 45 further determines in Step 153*e* whether or not the medium identification information 111 indicates an IC card. If the medium identification information 111 indicates an IC card, then the TV 45 displays an icon of an IC card in Step 153*f*. On the other hand, if the medium identification information 111 does not indicate an IC card, the TV 45 still further determines in Step 153*g* whether or not the medium identification information 111 indicates a mobile phone. If the medium identification information 111 indicates a mobile phone, then the TV 45 displays an icon of a mobile phone on a corner of the TV screen.

Figure 11:
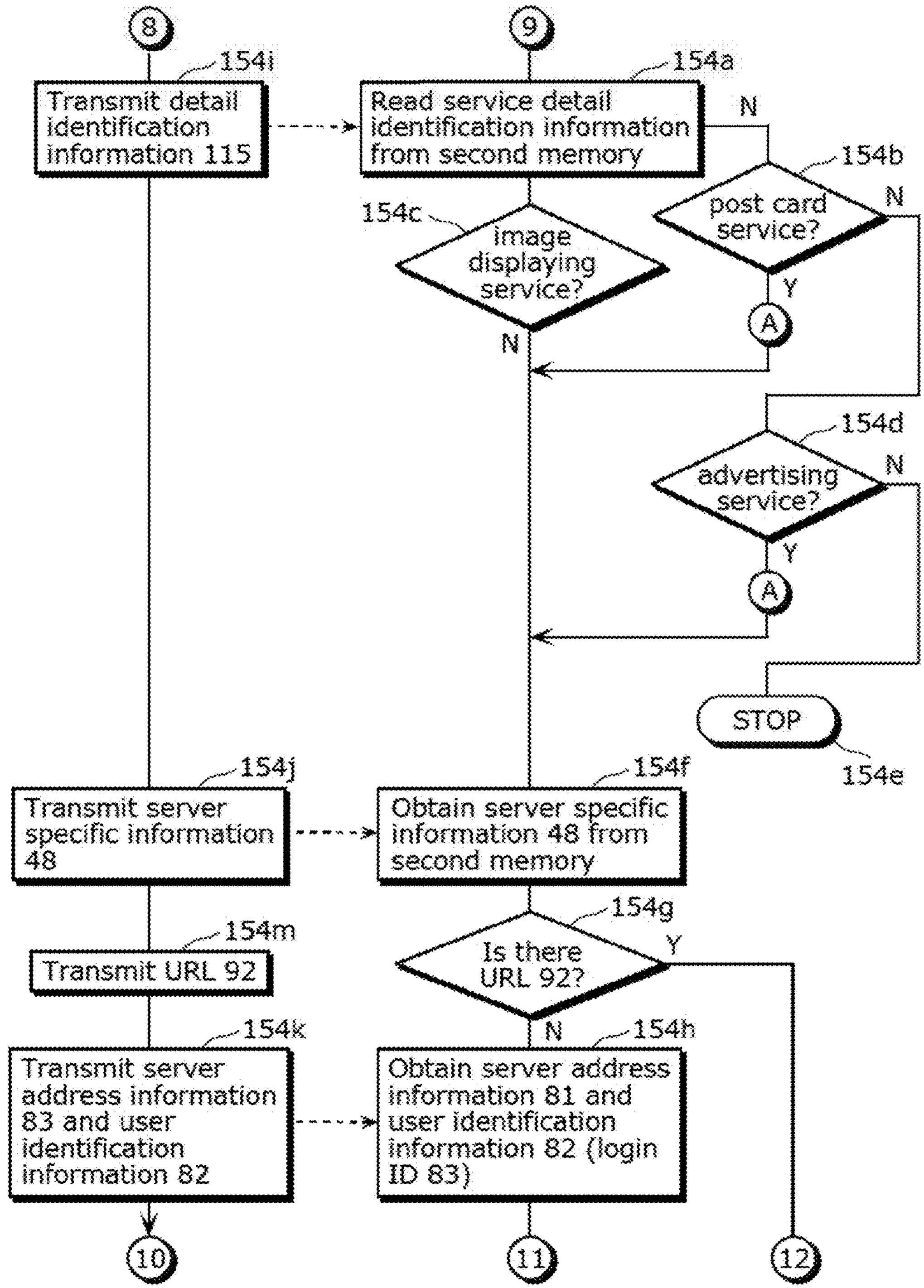
FIG. 11 is a flowchart of the processing performed by the image capturing device and the TV, according to Embodiment 1 of the present invention.
Figure 12:
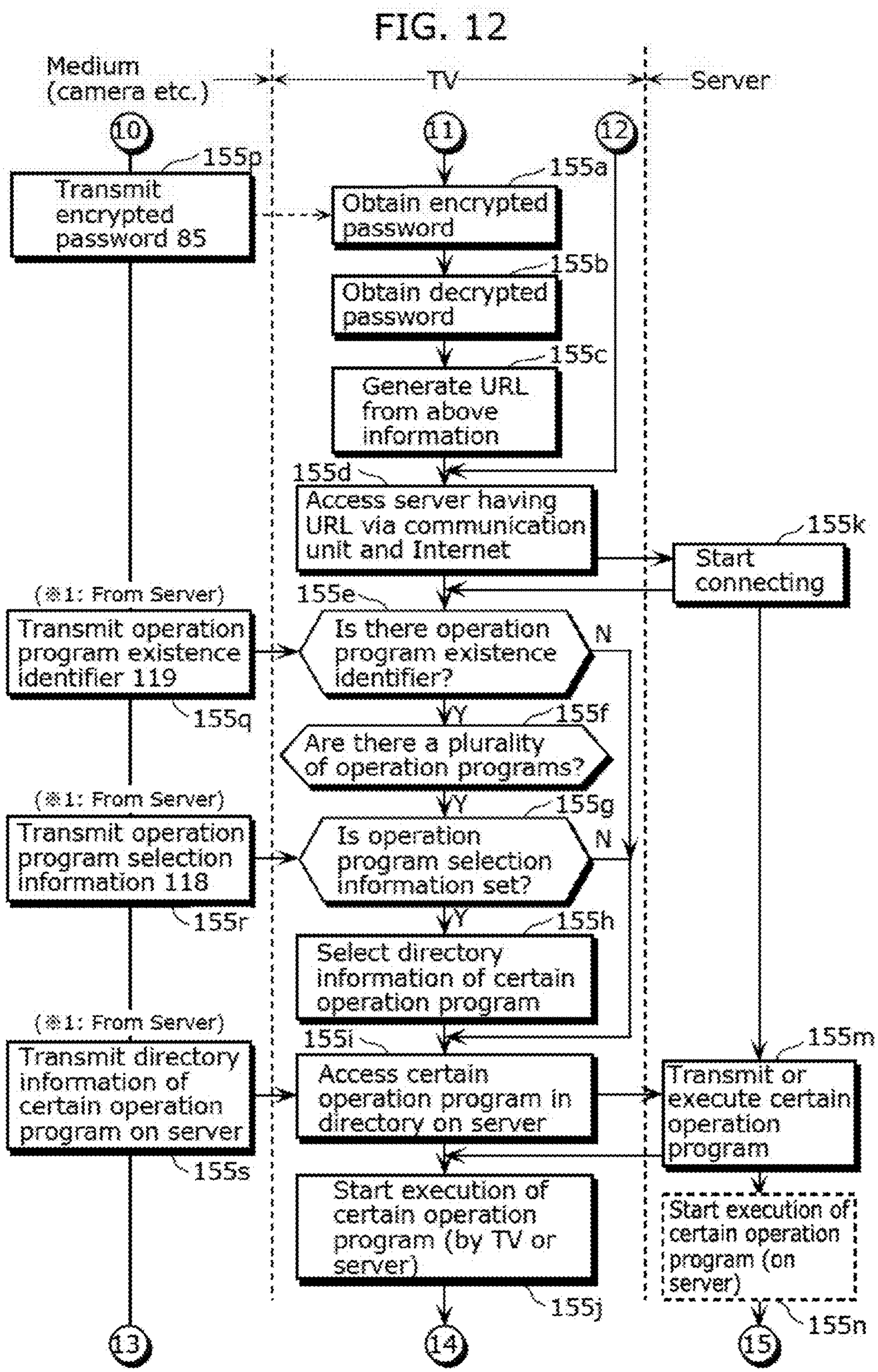
FIG. 12 is a flowchart of the processing performed by the image capturing device and the TV, according to Embodiment 1 of the present invention.
Figure 13:
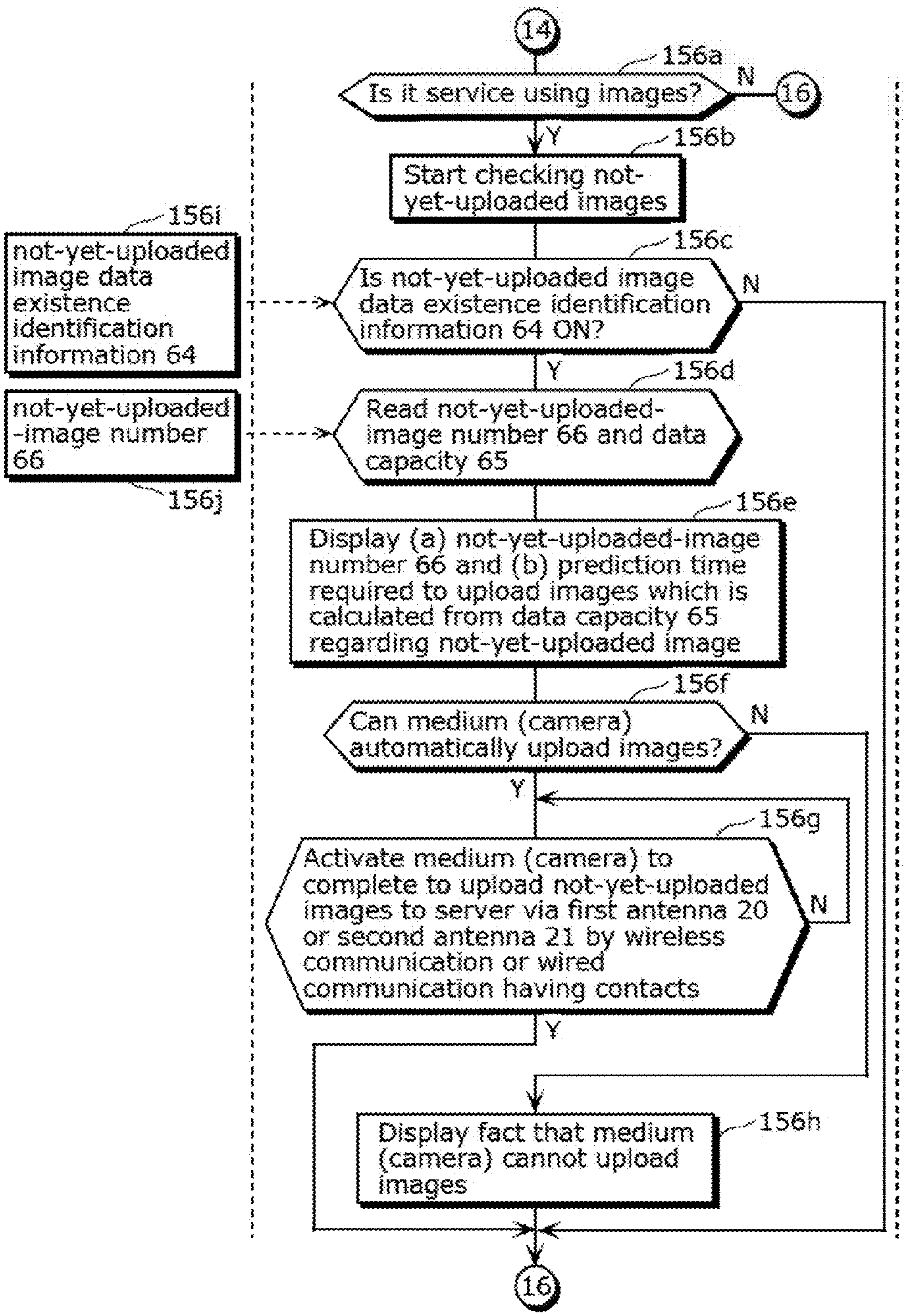
FIG. 13 is a flowchart of the processing performed by the image capturing device and the TV, according to Embodiment 1 of the present invention.

In Steps 154*a* and 154*i* of FIG. 11, the RF-ID reader/writer 46 reads service detail identification information from the server or the second memory. In Step 154*c*, the TV 45 side determines whether or not the service detail identification information indicates image display service. In Step 154*b*, the TV 45 side determines whether or not the service detail identification information indicates a post card service such as direct mail. In Step 154*d*, the TV 45 side determines whether or not the service detail identification information indicates advertising service. In Steps 154*f* and 154*j*, the RF-ID reader/writer 46 obtains the server specific information 48 from the second memory of the medium. In Step 154*g*, the TV 45 side determines whether or not the second memory stores the URL 92. If the second memory does not store the URL 92, then the processing proceeds to Steps 154*h* and 154*k* at which the TV 45 obtains the server address information 81 and the user identification information 82 from the second memory. In Steps 155*a* and 155*p* in FIG. 12, the TV obtains an encrypted password from the second memory. In Steps 155*b*, the TV decrypts the encrypted password. In Step 155*c*, the TV generates URL from the above pieces of information. In Step 155*d*, even if the second memory stores the URL 92, the TV accesses the server having the URL via the communication unit and the Internet. In Step 155*k*, the TV starts being connected to the server 42. In Step 155*q*, the medium reads out operation program existence identifier 119 from the second memory. In Step 155*e*, the TV determines whether or not the TV has any operation program existence identifier. If the TV has any operation program existence identifier, it is further determined in Step 155*f* whether or not there are a plurality of operation programs. If there are a plurality of operation programs, then the TV reads operation program selection information 118 from the second memory in Step 155*r*. In Step 155*g*, the TV determines whether or not the operation program selection information 118 is set. If the operation program selection information 118 is set, the TV selects directory information of a specific operation program in Step 155*h*. In Step 155*s*, the medium reads out directory information 117 of the specific operation program from the server and provides the directory information 117 to the TV. In Step 155*i*, the TV accesses the specific operation program in the directory on the server. In Step 155*m*, the server provides the specific operation program to the TV or executes the specific operation program on the server in Step 155*n*. In Step 155*j*, the TV (or the server) starts execution of the specific operation program. In Step 156*a* of FIG. 13, the TV determines whether or not the specific operation program is service using images. If the specific operation program is service using images, then the TV starts checking images not yet uploaded in Step 156*b*.

Figure 6:
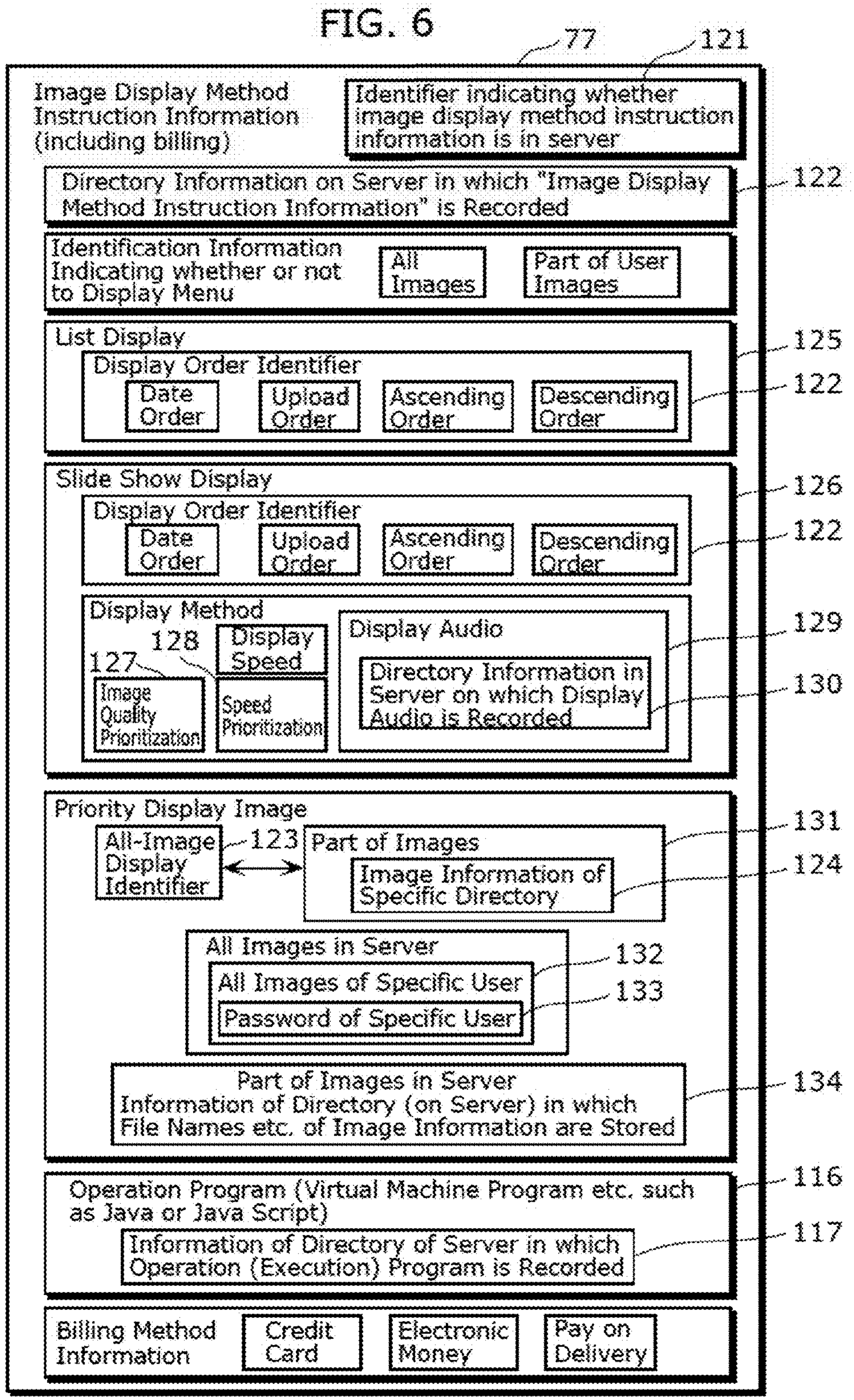
FIG. 6 is a block diagram of image display method instruction information of the image capturing device according to Embodiment 1 of the present invention.
Figure 14:
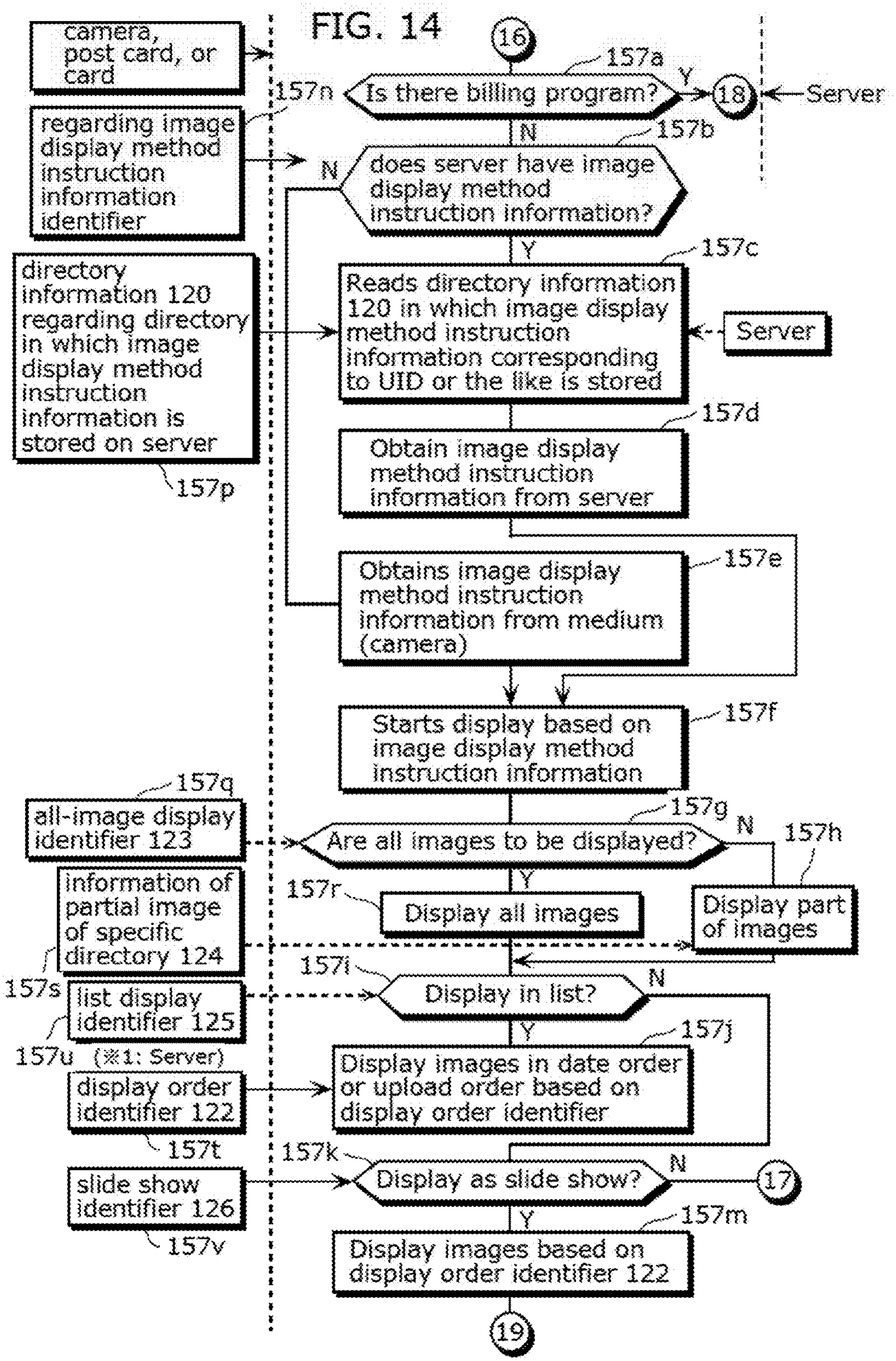
FIG. 14 is a flowchart of the processing performed by the image capturing device and the TV, according to Embodiment 1 of the present invention.

In Step 156*i*, the TV reads the not-yet-uploaded image data existence identification information 64 from the medium. In Step 156*c*, the TV determines whether or not the not-yet-uploaded image data existence identification information 64 indicates that there is any image not yet uploaded. If there is any image not yet uploaded, the TV reads the not-yet-uploaded-image number 66 and the data capacity 65 from the medium in Step 156*d*. In Step 156*e*, the TV displays (a) the not-yet-uploaded-image number 66 and (b) a prediction time required to upload images which is calculated from the data capacity 65 regarding image not yet uploaded. In Step 156*f*, the TV determines whether or not the medium (camera) is in a state where the medium can automatically upload images. If the medium can automatically upload images, then in Step 156*g*, the TV activates the medium (camera) to upload images not yet uploaded to the server via the first antenna 20 or the second antenna 21 by wireless communication or wired communication having contacts. When Step 156*g* is completed, the processing proceeds to Step 157*a* of FIG. 14. In Step 157*a*, the TV determines whether or not there is a billing program. If there is no billing program, then in Step 157*n*, the TV reads identifier 121 regarding the image display method instruction information which is shown in FIG. 6. In Step 157*b*, the TV determines whether or not the server has the image display method instruction information. If the server has image display method instruction information, then in Step 157*p*, the TV reads, from the medium, directory information 120 regarding a directory in which image display method instruction information is stored on the server. In Step 157*c*, the TV reads, from the medium, the directory information 120 in which the image display method instruction information corresponding to UID or the like is stored. In Step 157*d*, the TV obtains the image display method instruction information from the server. Then, the processing proceeds to Step 157*f*.

On the other hand, if the determination is made in Step 157*b* that the server does not have the image display method instruction information, then the processing proceeds to Step 157*e*. In Step 157*e*, the TV obtains the image display method instruction information from the medium (such as a camera). Then, the processing proceeds to Step 157*f*.

Figure 15:
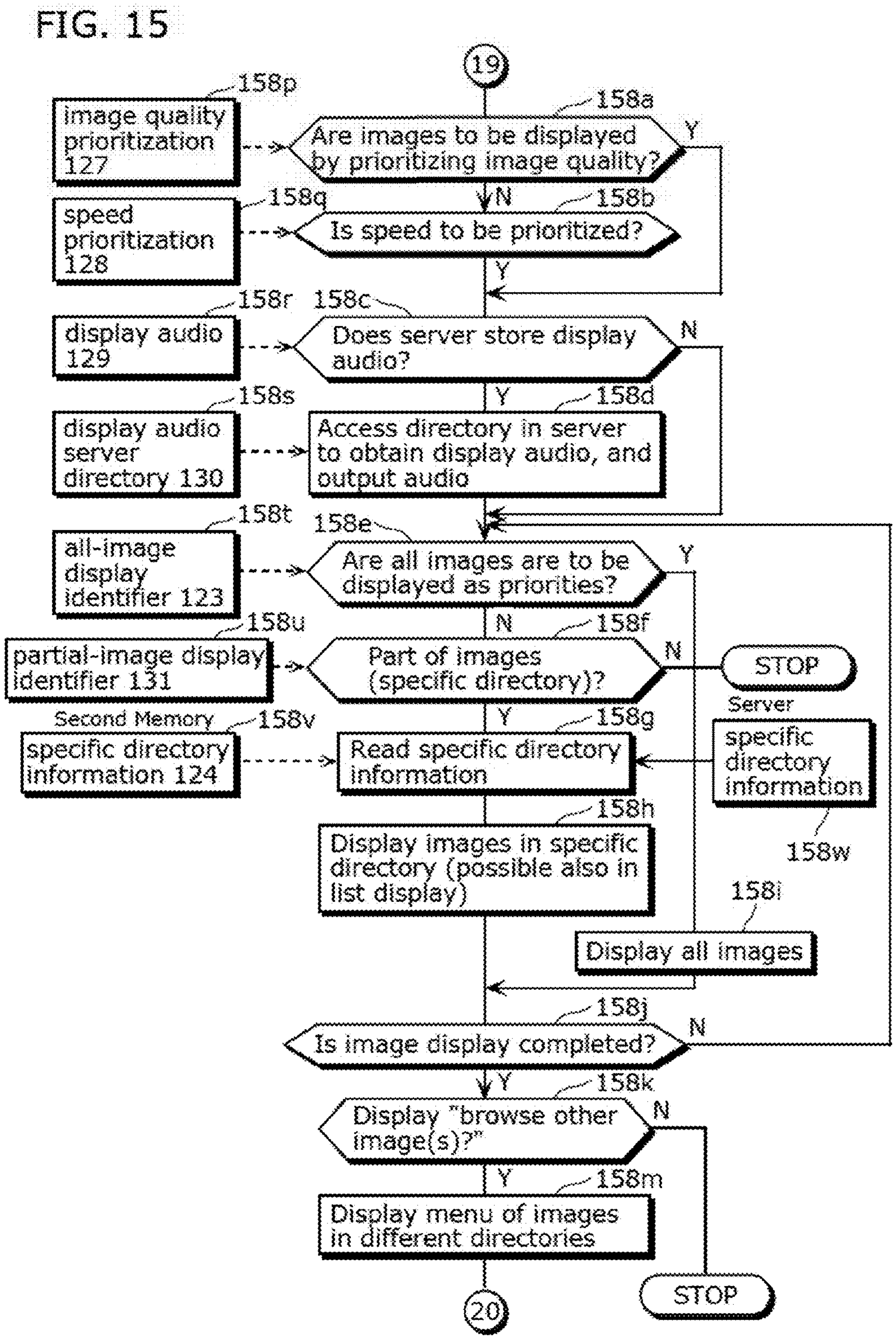
FIG. 15 is a flowchart of the processing performed by the image capturing device and the TV, according to Embodiment 1 of the present invention.

In Step 157*f*, the TV starts display of images based on the image display method instruction information. In Step 157*g*, the TV reads an all-image display identifier 123 from the medium. In Step 157*g*, the TV determines whether or not the all-image display identifier 123 indicates that all images are to be displayed. If all images are to be displayed, the TV displays all images in Step 157*r*. On the other hand, if all images are not to be displayed, then in Step 157*h*, the TV displays a part of images in a specific directory identified by the directory information 124 that is read in Step 157*s* from the medium. In Step 157*i*, the TV determines whether or not a list display identifier 125 indicates that images to be displayed in a list. If the images are to be displayed in a list, then the TV reads a display order identifier 122 in Step 157*t*. In Step 157*j*, the TV displays the images in a list in a date order or an upload order based on the display order identifier. In Step 157*v*, the TV reads a slide show identifier 126 from the medium. In Step 157*k*, the TV determines whether or not the slide show identifier 126 indicates that images are to be displayed as slide show. If the images are to be displayed as a slide show, then in Step 157*m*, the TV displays the images as slide show based on the display order identifier 122. Then, the TV reads image quality prioritization 127 from the second memory of the medium. In Step 158*a* of FIG. 15, the TV determines whether or not the image quality prioritization 127 indicates that the images are to be displayed by prioritizing image quality. If the images are not to be displayed by prioritizing image quality, the TV reads speed prioritization 128 from the medium in Step 158*q* and further determines in Step 158*b* whether or not the speed prioritization 128 indicates that the images are to be displayed by prioritizing a speed. If a speed is to be prioritized, then the TV determines in Step 158*c* whether or not the server stores display audio. In Step 158*s*, the TV reads and checks display audio server directory 130 from the medium. In Step 158*d*, the TV accesses the directory in the server to obtain the display audio and outputs the audio.

In Step 158*e*, the TV determines whether or not all images are to be displayed as priorities. If all images are not to be displayed as priorities, then in Step 158*f*, the TV selects a part of the images. In Steps 158*g*, the TV reads specific directory information 124 from the medium in Step 158*v*, and receives images in the specific directory from the server in Step 158*w*. In Step 158*h*, the TV displays the images in the specific directory. On the other hand, if it is determined in Step 158*e* that all images are to be displayed as priorities, then the TV may display all images in Step 158*i*. In Step 158*j*, the TV determines whether or not the image display is completed. If the image display is completed, then the TV displays a message "view other image(s)?" in Step 158*k*. If the user agrees, then the TV displays a menu of images in different directories in Step 158*m*.

Figure 16:
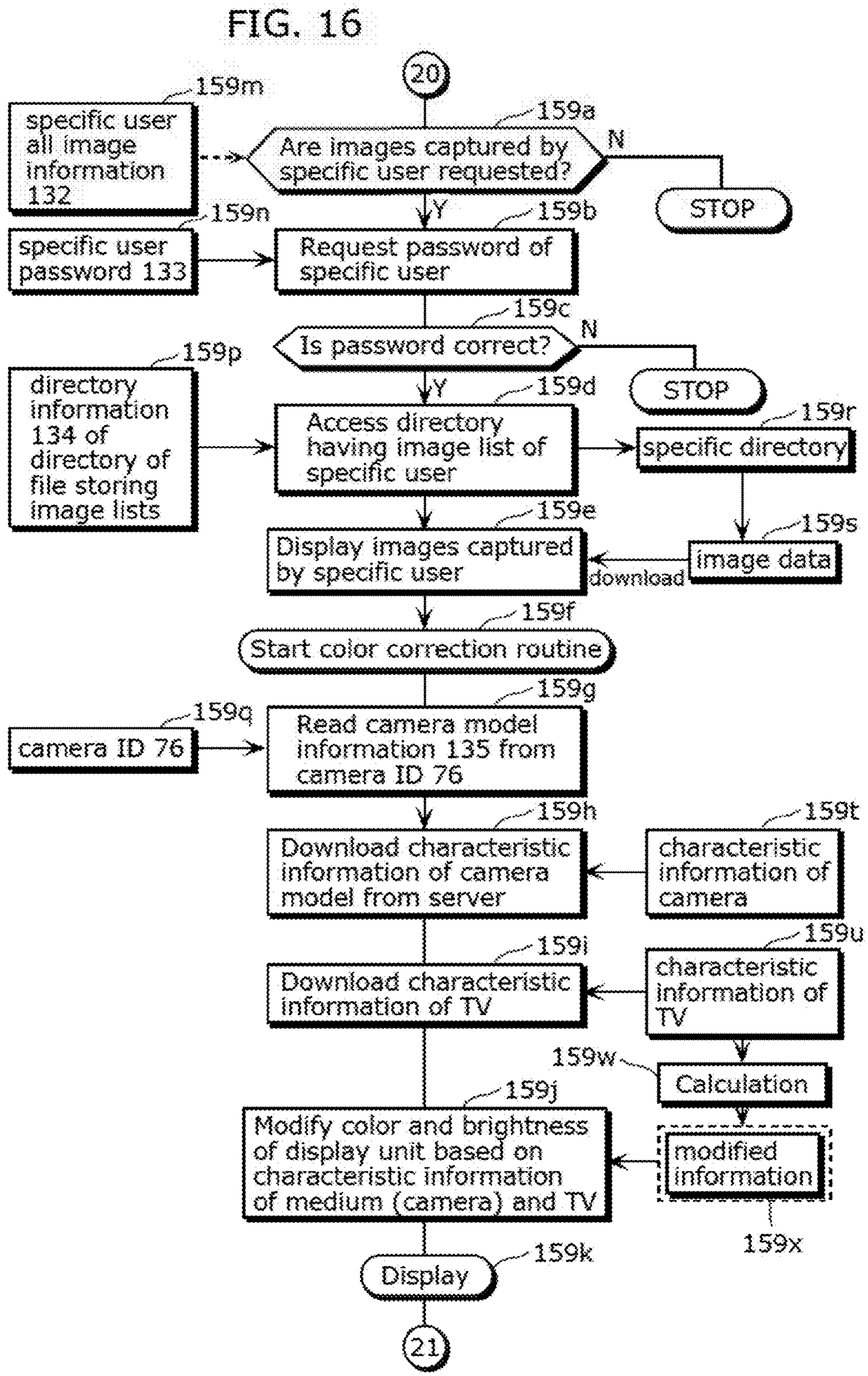
FIG. 16 is a flowchart of the processing performed by the image capturing device and the TV, according to Embodiment 1 of the present invention.

In Step 159*a* of FIG. 16, the TV determines whether or not images captured by a specific user are requested. If images captured by a specific user are requested, then in Step 159*b*, the TV requests the medium to provide (a) specific user all image information 132 in Step 159*m* and (b) a specific user password 133 that is a password of the specific user. In Step 159*c*, the TV determines whether or not the password is correct. If the password is correct, then in Step 159*p*, the TV reads directory information 134 of a directory of a file storing an image list from the medium. In Step 159*d*, the TV accesses the server to access a directory having an image list of the specific user. In Step 159*r*, the TV downloads image data in the directory from the server. In Step 159*e*, the TV displays the images captured by the specific user.

In Step 159*f*, the TV starts color correction routine. In Step 159*g*, the TV reads camera model information from the camera ID 76. In Steps 159*h* and 159*t*, the TV downloads characteristic information of the camera model from the server. Then, in Steps 159*i* and 159*u*, the TV downloads characteristic information of the TV from the server. In Step 159*w*, the server calculates the characteristic information to generate modified information. In Step 159*j*, the TV modifies color and brightness of the display unit based on the pieces of characteristic information of the medium (camera) and the TV. In Step 159*k*, the TV displays the images with the modified color and brightness.

Figure 17:
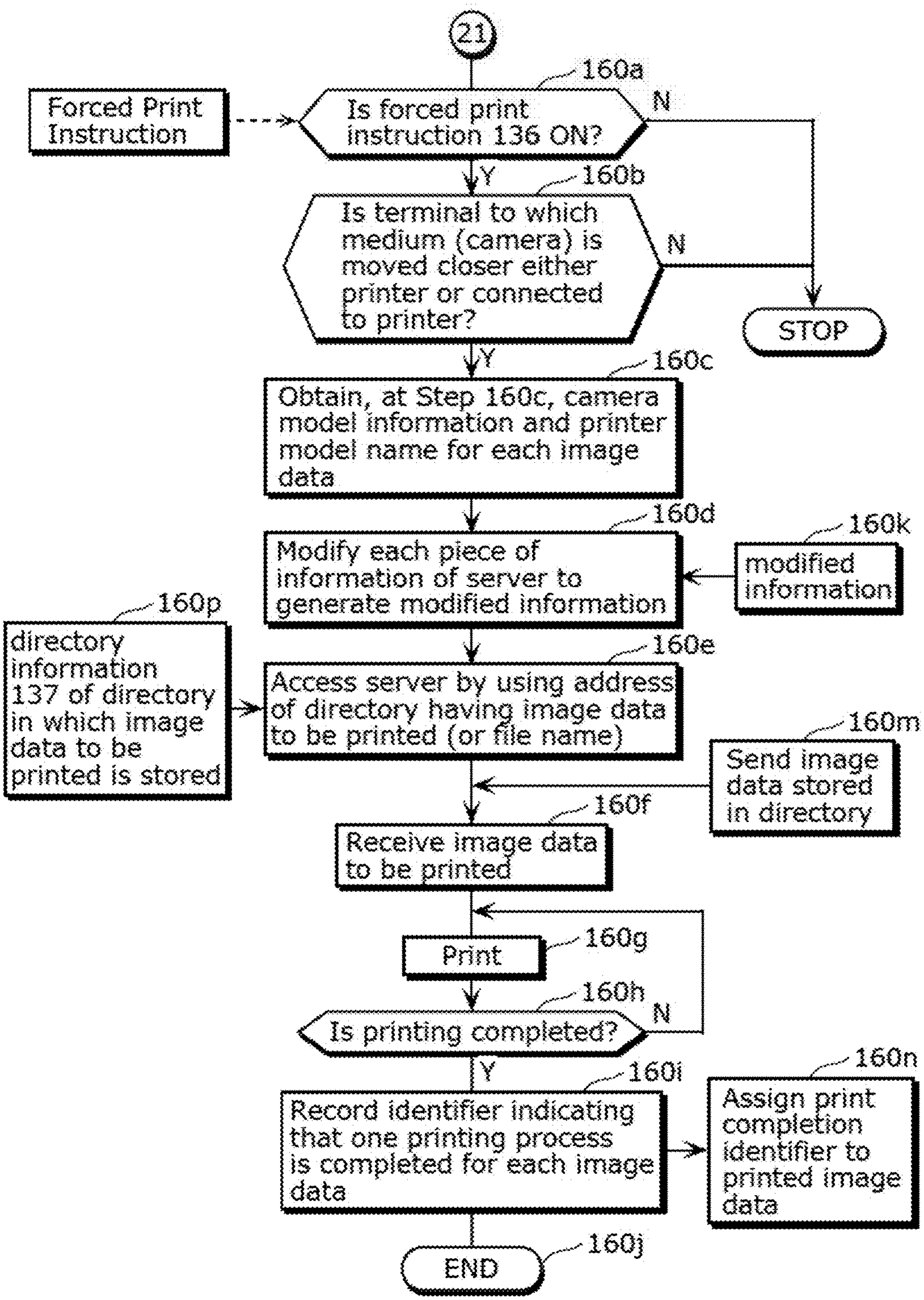
FIG. 17 is a flowchart of the processing performed by the image capturing device and the TV, according to Embodiment 1 of the present invention.

In Step 160*a* of FIG. 17, the TV determines whether or not forced print instruction is selected. Here, if forced print instruction is selected, it is determined in Step 160*b* whether or not the terminal (the TV in the above example) to which the medium (camera) is moved closer is a printer or a terminal connected to the printer. If the terminal is a printer or a terminal connected to the printer, then the terminal obtains, in Step 160*c*, camera model information of the medium (camera) and a model name of the printer for each image data. In Step 160*d*, the terminal modifies each piece of information of the server to generate modified information. In Step 160*p*, the terminal receives directory information 137 of a directory in which the image data to be printed is stored. At 160*e*, the terminal accesses the server by using an address of the directory having the image data to be printed (or file name). In Step 160*m*, the server sends the image data stored in the directory to the terminal. In Step 160*f*, the TV receives the image data to be printed. In Step 160*g*, the terminal prints the image data. In Step 160*h*, the printing is completed. In Step 160*i*, for each image data, the terminal records, onto the server, an identifier indicating that one printing process is completed. In Step 160*n*, the server assigns a print completion identifier to the image data that is stored in the server and has been printed.

Next, the following describes the situation where the medium such as a camera or a post card does not have a memory for storing data.

Figure 8:
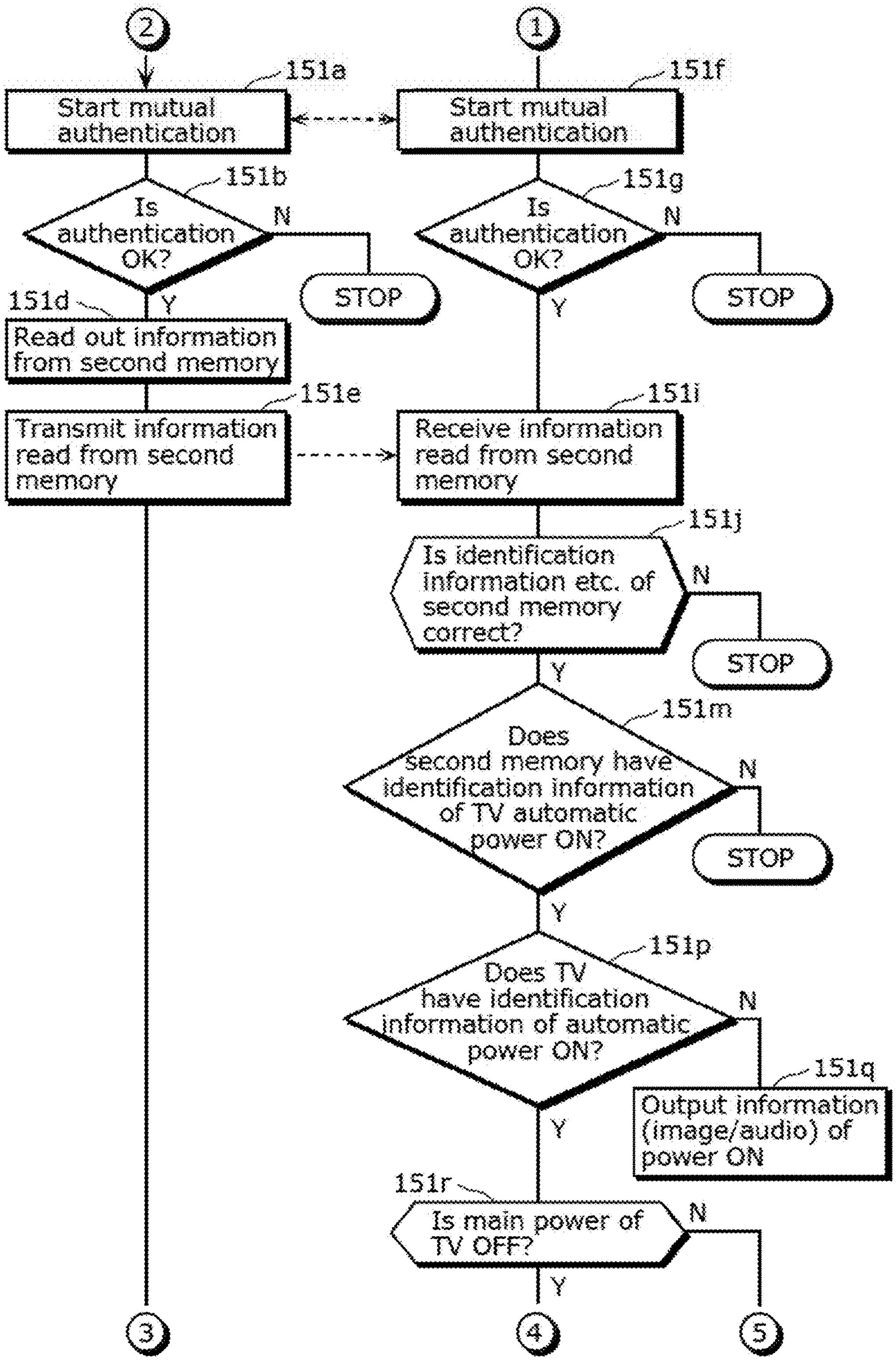
FIG. 8 is a flowchart of the processing performed by the image capturing device and the TV, according to Embodiment 1 of the present invention.
Figure 9:
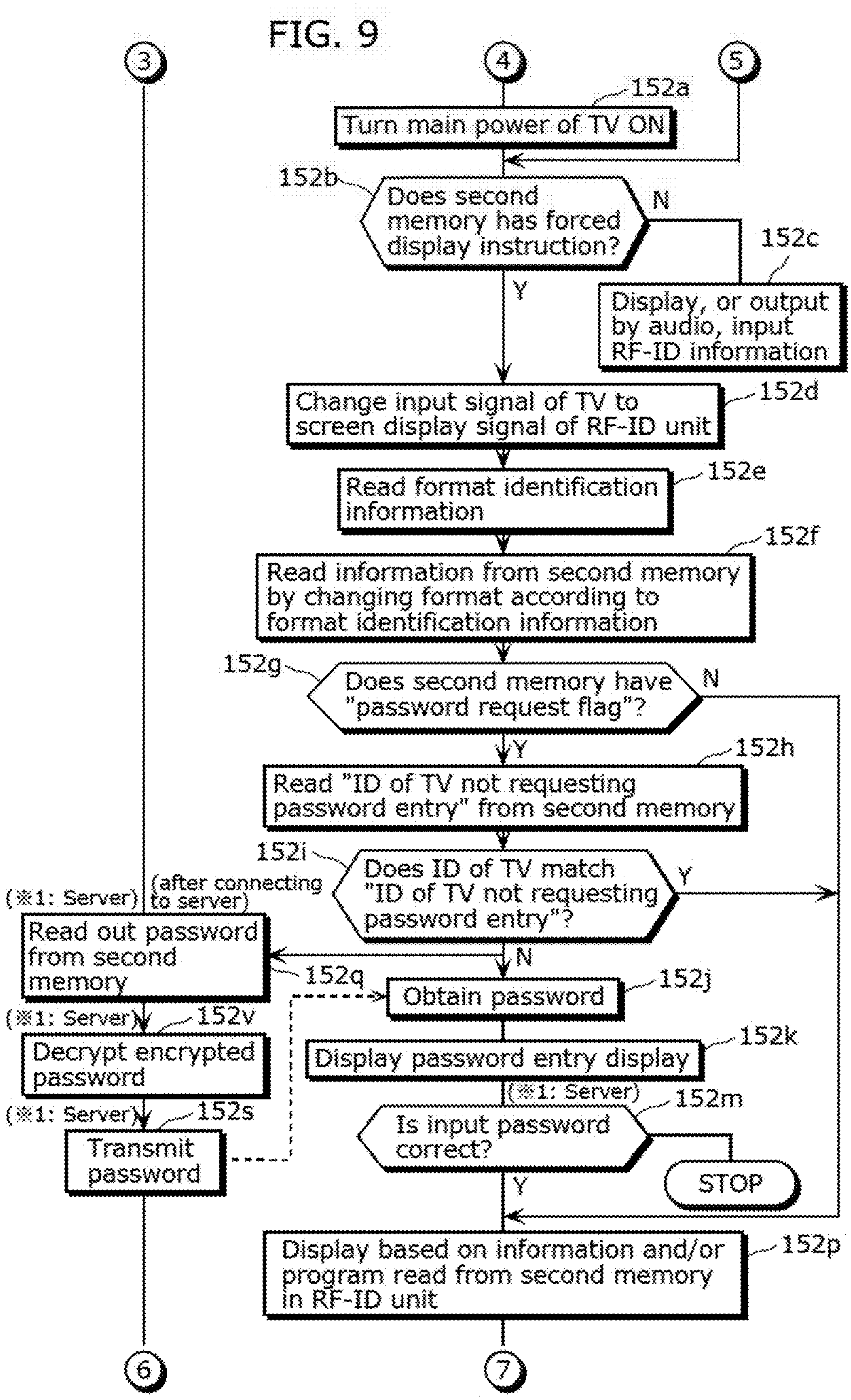
FIG. 9 is a flowchart of the processing performed by the image capturing device and the TV, according to Embodiment 1 of the present invention.
Figure 18:
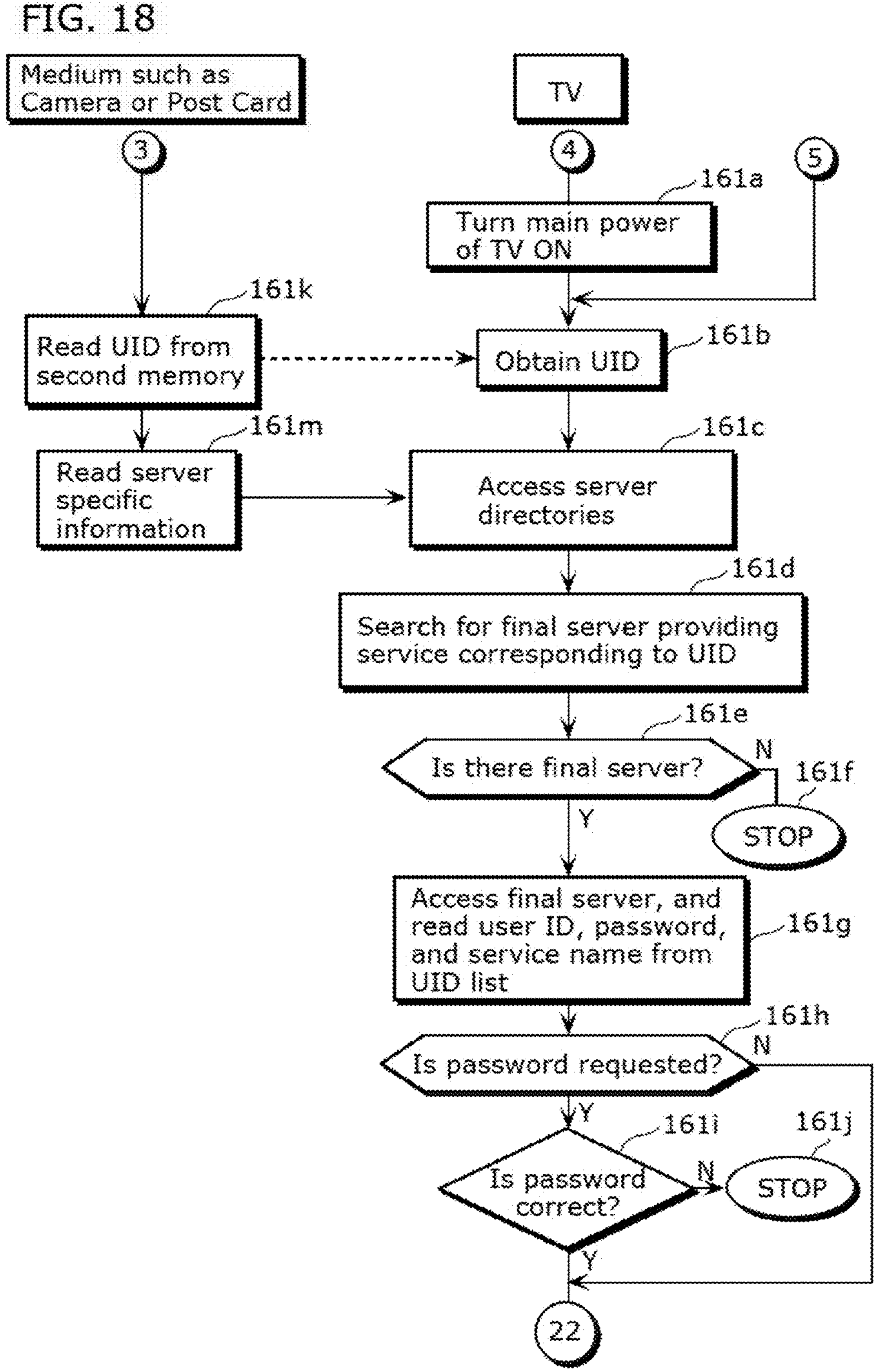

Steps of FIG. 18 follow the numbers 3, 4, and 5 in circles in FIG. 8. In Step 161*a* of FIG. 18, a main power of the TV is turned ON. In Step 161*k*, the TV reads UID of the RF-ID unit from the second memory. In Step 161*b*, the TV obtains the UID. In Step 161*m*, the TV reads the server specific information 48 from the second memory. In Step 161*c*, the TV accesses a server directory. In Step 161*d*, the TV searches the server directories for a final server providing service corresponding to the UID. In Step 161*e*, the TV determines whether or not such a final server exists. If there is such a final server, then in Step 161*g*, the TV accesses the final server and reads a user ID, a password, and a service name from a UID list. In Step 161*h*, the TV determines whether or not a password is requested. If the password is requested, then the TV determines in Step 161*i* whether or not the readout password is correct. In Step 162*a* of FIG. 19, the TV determines whether or not the service is regarding photographs or video. If the service is regarding photographs or video, then in Step 162*b*, the TV (i) reads, from a specific directory in the server associated with the UID, (a) a corresponding program such as a billing program, (b) a list including an address or a file name of image data to be displayed, (c) image display instruction information, (d) forced display instruction, (e) forced print instruction, and (f) camera ID, and (ii) automatically displays the image data or causes the image data to be printed, based on the above pieces of information and procedure.

If needed, password entry is requested in Step 162*b*. In Step 162*c*, the TV determines whether or not the user desires to print a specific image. If the user desires to print a specific image, then in Step 162*d*, the TV adds data of the specific image to the server associated with the UID or to a print directory of the TV. In Step 162*e*, the TV determines whether or not the TV is connected to a printer and there is an independent printer. If so, then, in Step 162*f*, the RF-ID unit of the medium such as a post card is moved into proximity of a RF-ID reader/writer of the printer. In Step 163*a* of FIG. 20, the printer (i) reads UID of the RF-ID from the medium, (ii) thereby reads image data to be printed or a location of the image data from the print directory on the server having the modified information, and (iii) prints the image data. In Step 163*b*, the printing is completed. Thereby, the above processing is completed.

Figure 19:
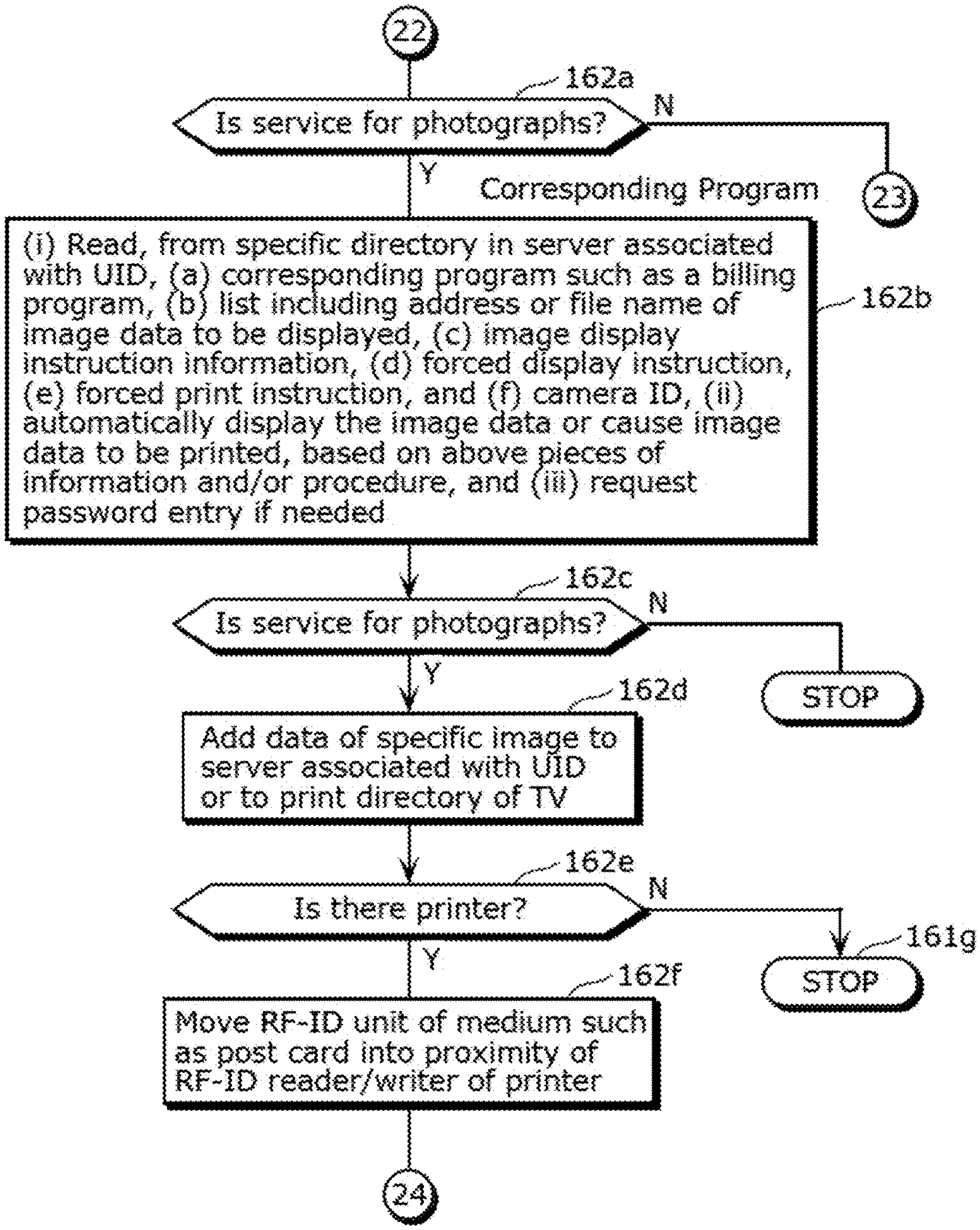
FIG. 19 is a flowchart of the processing performed by the image capturing device and the TV, according to Embodiment 1 of the present invention.
Figure 20:
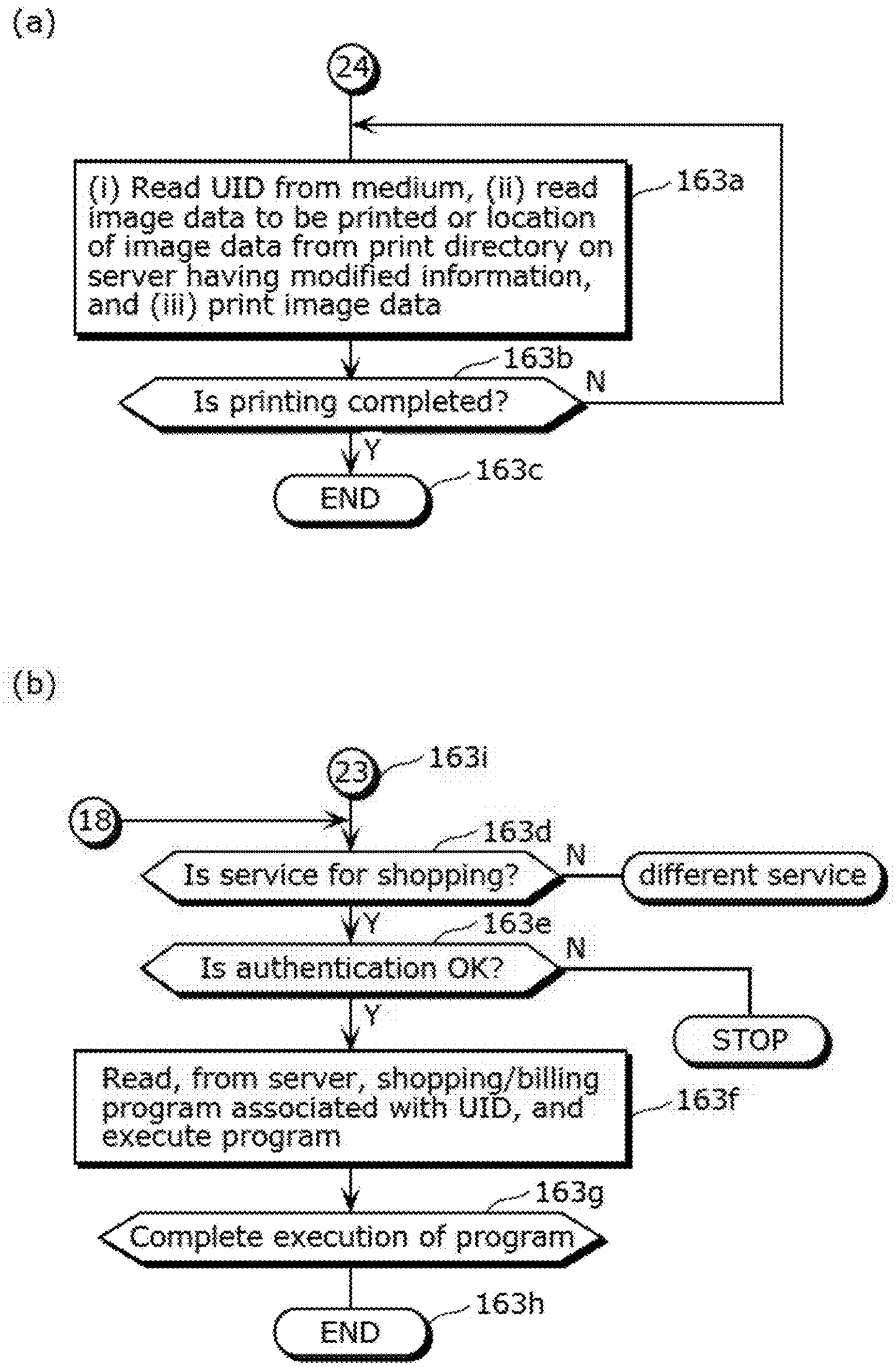
FIG. 20 is a flowchart of the processing performed by the image capturing device and the TV, according to Embodiment 1 of the present invention.

Step 163*i* of FIG. 20 is the number 23 in FIG. 19. In Step 163*d*, the TV determines whether or not the service is for shopping. If the service is for shopping, then the TV determines in Step 163*e* whether or not authentication is successful. If the authentication is successful, then in Step 163*f*, the TV reads, from the server, a shopping/billing program associated with the UID, and executes the program. In Step 163*g*, the execution of the program is completed. Thereby, the above processing is completed.

Next, the following describes a method of reading information from a RF-ID unit embedded in a postcard without a RF-ID reader.

Figure 21:
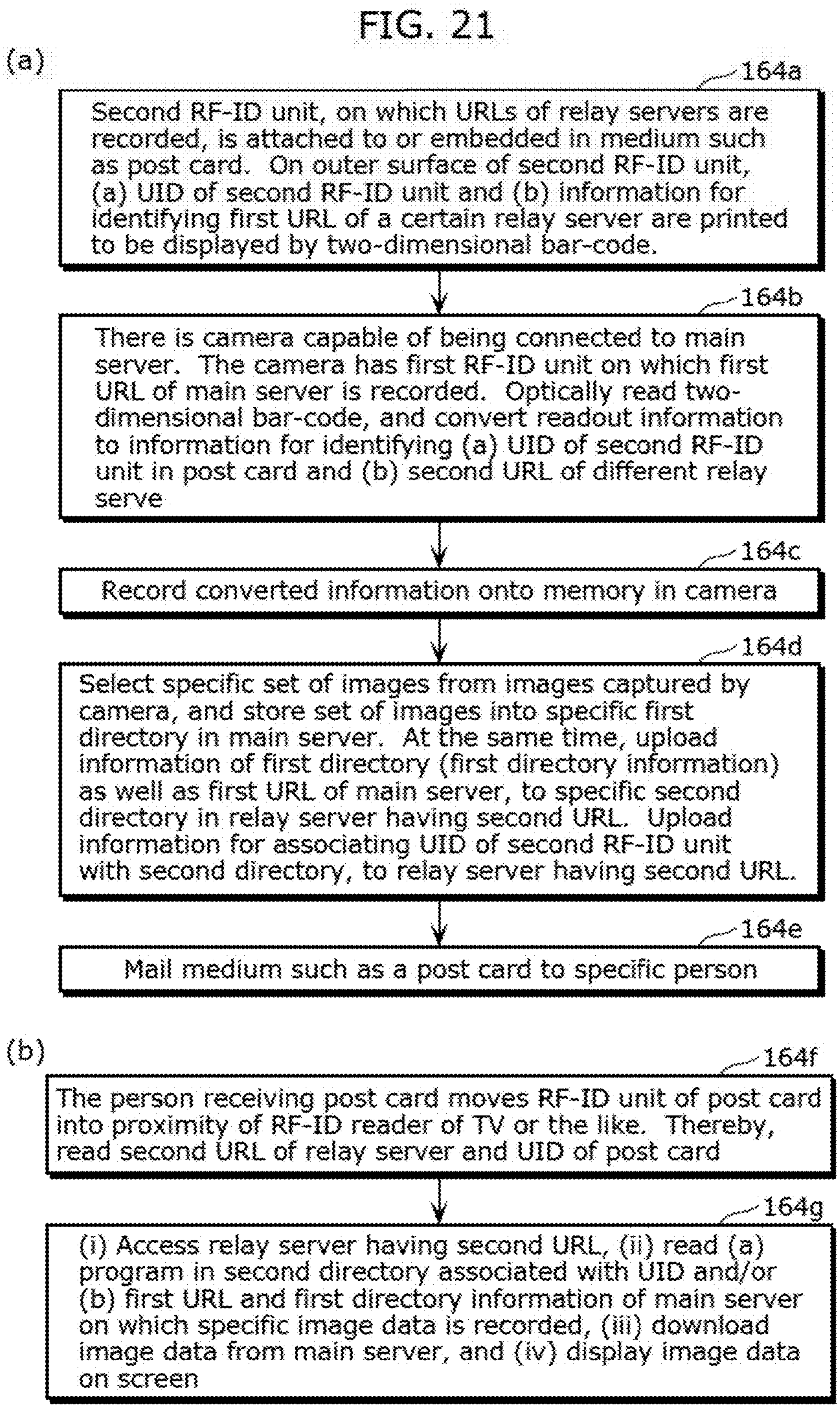
FIG. 21 is a flowchart of the processing performed by the image capturing device and the TV, according to Embodiment 1 of the present invention.

In Step 164*a* in FIG. 21, a second RF-ID unit, on which URLs of relay servers are recorded, is attached to or embedded in the medium such as a post card. On the outer surface of the second RF-ID unit, (a) UID of the second RF-ID unit and (b) information for identifying a first URL of a certain relay server are printed to be displayed by a two-dimensional bar-code.

In Step 164*b*, there is a camera capable of being connected to a main server. The camera has a first RF-ID unit on which a first URL of the main server is recorded. An image capturing unit in the camera optically reads the two-dimensional bar-code, and converts the readout information to information for identifying (a) the UID of a second RF-ID unit in the post card and (b) a second URL of a relay server.

In Step 164*c*, the converted information is recorded onto a memory in the camera.

In Step 164*d*, the camera selects a specific set of images from images captured by the camera, and stores the set of images into a specific first directory in the main server. At the same time, the camera uploads information of first directory (first directory information) as well as the first URL of the main server, a specific second directory in the relay server having the second URL. The camera uploads information for associating the UID of the second RF-ID unit with the second directory, to the relay server having the second URL. In Step 164*e*, the medium such as a post card is mailed to a specific person.

In Step 164*f*, the person receiving the post card moves the RF-ID unit of the post card into proximity of a RF-ID reader of a TV or the like. Thereby, the TV reads, from the RF-ID unit, the second URL of the relay server and the UID of the post card.

In Step 164*g*, the TV accesses the relay server having the second URL. Then, the TV reads, from the relay server, (a) a program in the second directory associated with the UID and/or (b) the first URL and the first directory information of the main server on which specific image data is recorded. The TV downloads the image data from the main server. The TV displays the image data on a screen. In the above case, the image capturing unit in the image capturing device according to Embodiment 1 of the present invention reads information from the two-dimensional bar-code that is generally printed in a product or post card to record server information. Then, the image capturing device records the information read from the two-dimensional bar-code, as digital information, onto the second memory of the RF-ID unit. Thereby, the image capturing device allows a RF-ID reader of a TV to read the information. As a result, even a TV without an optical sensor for two-dimensional bar-codes can indirectly read information of two-dimensional bar-codes and automatically access a server or the like.

(a) in FIG. 22 illustrates the situation where display is presented when the image capturing device 1 is moved into proximity of a RF-ID antenna 138 of the TV 45.

When the image capturing device 1 is moved into proximity of the antenna 138, the TV 45 displays a camera icon 140 for notifying of that the medium is a camera in the manner described previously.

Next, since the number (for example, five) of images not yet uploaded is detected, the TV 45 displays five blank images 142*a*, 142*b*, 142*c*, 142*d*, and 142*e* as if these images were taken out from the camera icon 140.

Thereby, the TV 45 displays "tangible" information of images by changing "materials to information". As a result, the user can perceive the information of images by more natural sense.

Regarding images that have been already uploaded to the server, actual images 143*a*, 143*b*, and 143*c* are displayed as tangible data in the same manner as described above.

(b) in FIG. 22 illustrates the situation where RF-ID is embedded in a post card 139. The RF-ID reader/writer 46 of the TV 45 reads attribute information of the post card from the RF-ID. Thereby, the TV 45 displays a post-card icon 141 at a bottom left corner of the display unit of the TV 45 as illustrated in (b) in FIG. 22. The TV 45 also displays images stored in the server or a menu screen as tangible data in the same manner as described with reference to (a) in FIG. 22.

Next, the following processing is described in detail. By the processing, an operation program 116 illustrated in FIG. 4 is transmitted to the TV 45 illustrated in FIG. 3 that is an apparatus (device) communicating with the RF-ID unit 47 of the image capturing device 1. The communicating device (TV 45) executes the transmitted program.

Figure 23:
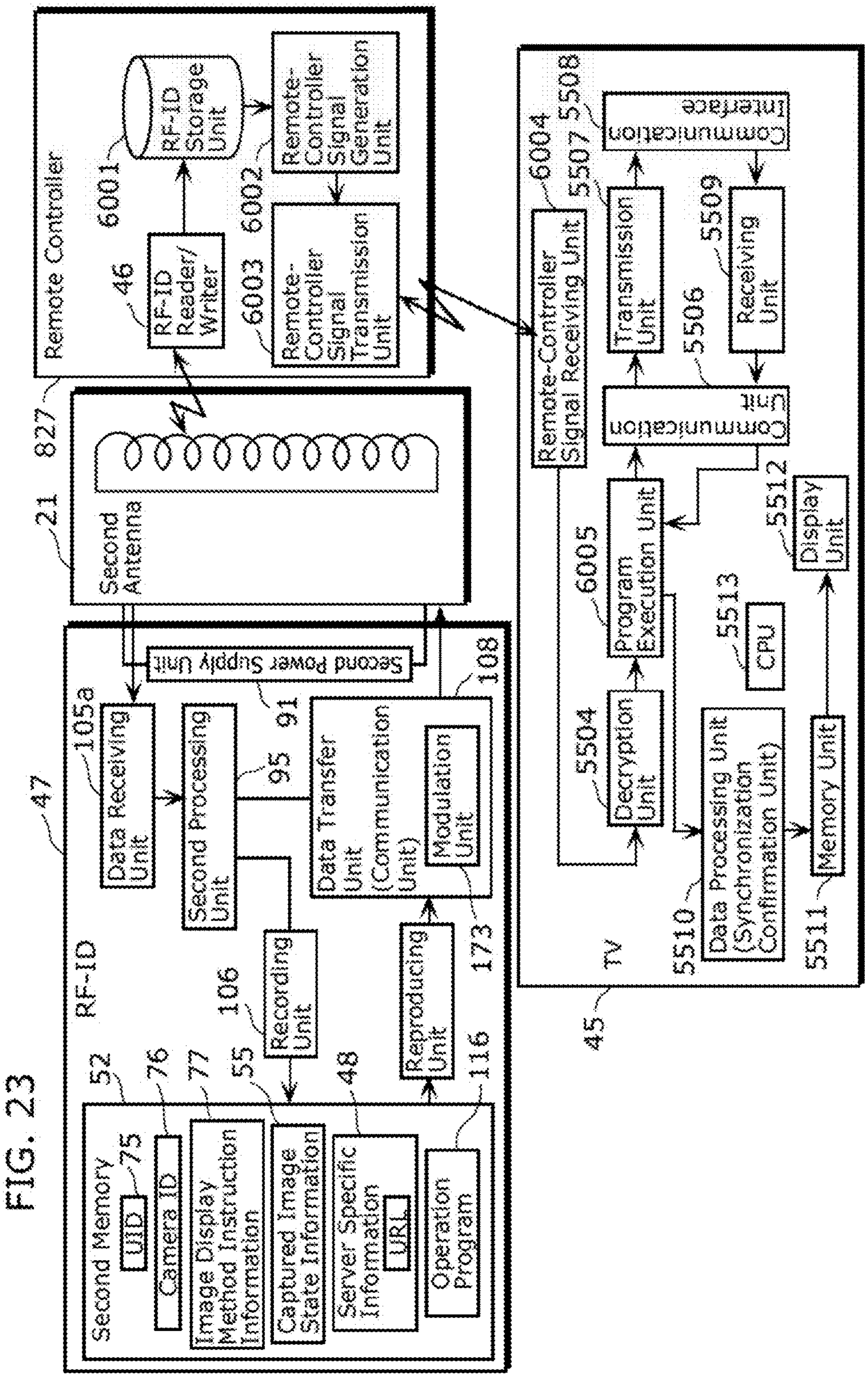
FIG. 23 is a block diagram of a RF-ID unit in the image capturing device for storing an operation program, a remote controller of the TV, and the TV.

FIG. 23 is a block diagram of a configuration in which the apparatus communicating with the RF-ID unit 47 in the image capturing device 1 executes the transmitted program. FIG. 23 illustrates a communication system including a part of the image capturing device 1 (the RF-ID 47 and the second antenna 21), the TV 45, and a remote controller 827 of the TV 45. Here, the image capturing device 1 is implemented as a camera which has the RF-ID unit 47 to perform proximity wireless communication with the RF-ID reader/writer 46. The RF-ID reader/writer 46 is connected to the TV 45 by an infrared communication path. The camera includes the second antenna 21, the data receiving unit 105, the second memory 52, and the data transfer unit 108. The second antenna 21 is used for the proximity wireless communication. The data receiving unit 105 receives, via the second antenna 21, an input signal provided from the RF-ID reader/writer 46. The second memory 52 is a nonvolatile memory holding at least (a) the UID unit 75 that is identification information for identifying the image capturing device 1, and (b) the operation program 116 that is to be executed by the TV 45 with reference to the UID unit 75. The data transfer unit 108 transmits the UID unit 75 and the operation program 116 stored in the second memory 52 to the RF-ID reader/writer 46 via the second antenna 21, according to the input signal received by the data receiving unit 105. The UID unit 75 and the operation program 116 transmitted from the data transfer unit 108 are transmitted to the TV 45 via the data transfer unit 108, the second antenna 21, the RF-ID reader/writer 46, and then the infrared communication path. The following explains the above units in more detail.

The RF-ID unit 47 in the image capturing device 1 has the second memory 52. The second memory 52 holds the operation program 116. The operation program 116 can be executed by the TV 45 communicating with the RF-ID unit. In more detail, the operation program 116 is an example of the program executed by the TV 45 with reference to the identification information of the image capturing device 1. The operation program 116 is, for example, an execution program such as Java™ program, a virtual-machine script program such as Javascript™ program, or the like.

The reproducing unit in the RF-ID unit 47 reads necessary information and the operation program 116 from the second memory 52. The necessary information is required to execute the operation program 116. The necessary information includes the UID unique to the image capturing device 1, the server specific information including the URL of the server, and the like. The necessary information and the operation program 116 are transmitted to the RF-ID reader/writer 46 in the remote controller 827 via the data transfer unit 108 and the second antenna 21. The remote controller 827 remotely controls the TV 45.

The RF-ID reader/writer 46 of the remote controller 827 receives the necessary information and the operation program from the RF-ID unit 47 of the image capturing device 1 and stores them into a RF-ID storage unit 6001.

A remote-controller signal generation unit 6002 in the remote controller 827 converts the necessary information and the operation program, which are transmitted from the RF-ID unit 47 of the image capturing device 1 and stored in the RF-ID storage unit 6001, to remote-controller signals. The remote-controller signals, such as infrared signals, are widely used in communication for present remote controllers.

To the TV 45, a remote-controller signal transmission unit 6003 transmits the remote-controller signals including the operation program which are generated by the remote-controller signal generation unit 6002.

A remote-controller signal receiving unit 6004 in the TV 45 receives the remote-controller signals from the remote controller 827. A program execution unit 6005, such as a Java™ virtual machine, retrieves the necessary information and the operation program in the RF-ID unit 47 of the image capturing device 1, from the remote-controller signals by using a decryption unit 5504. Thereby, the program execution unit 6005 executes the operation program.

Figure 24:
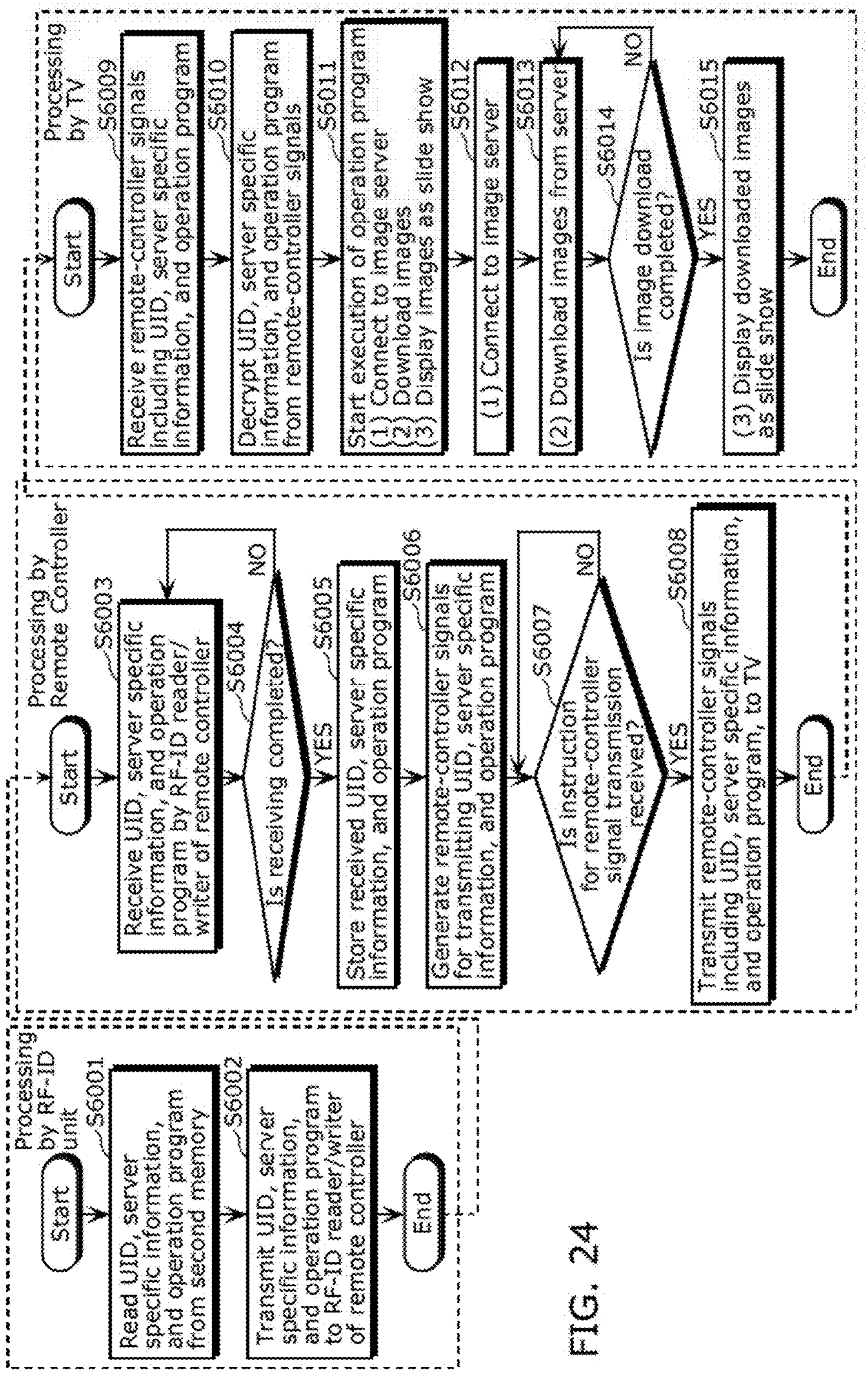
FIG. 24 is a flowchart of processing for transferring and executing the operation program stored in the RF-ID unit.

FIG. 24 is a flowchart of execution of the operation program for "downloading data of images from an image server with reference to identification information (UID in this example) of the image capturing device 1, and displaying the images as a slide show".

When the remote controller is moved into proximity of the image capturing device 1, the RF-ID reader/writer 46 of the remote controller provides power to the RF-ID unit 47 in the image capturing device 1 via RF-ID communication. Thereby, the UID 75 unique to the image capturing device 1, the URL 48 of the image server (image server URL), and the operation program 116 are read from the second memory 52 (S6001). The readout UID, image server URL, and operation program are transmitted to the remote controller 827 via the data transfer unit 108 and the second antenna 21 (S6002). Here, as presented in FIG. 25, the operation program includes server connection instruction 6006, download instruction 6008, slide show display instruction 6010, download-completion-time processing set instruction 6007, and download-completion-time instruction 6009.

The remote controller 827 receives the UID, the image server URL, and the operation program from the image capturing device 1 via the RF-ID reader/writer 46 (S6003). A determination is made as to whether or not receiving is completed (S6004). If receiving is completed, then the UID, the image server URL, and the operation program are stored in the RF-ID storage unit 6001 (S6005). Then, the UID, the image server URL, and the operation program are converted to remote-controller signals transmittable by infrared ray (S6006). A determination is made as to whether or not the user performs a predetermined input operation by the remote controller 827 to instruct to transmit the remote-controller signals to the TV 45 (S6007). If the instruction is received by from user, then the remote-controller signal transmission unit 6003 transmits the remote-controller signals including the image server URL and the operation program to the TV 45 (S6008). In other words, serving as a common remote controller, the remote controller 827 serves also as a relay device that transfers the UID, the image server URL, and the operation program from the image capturing device 1 to the TV 45 by using the embedded RF-ID reader/writer 46.

Next, the TV 45 receives the remote-controller signals from the remote controller 827 (S6009). The decryption unit 5504 in the TV 45 retrieves (decrypts) the UID, the image server URL, and the operation program from the remote-controller signals (S6010). Then, the program execution unit 6005 executes the operation program with reference to the image server URL (S6011 to S6015). More specifically, by the operation program, connection between the TV 45 and the image server 42 on a communication network is established with reference to the image server URL (S6012, and 6006 in FIG. 25). Then, with reference to the UID unique to a corresponding image capturing unit, image data captured by a specific image capturing unit is selected from the image data 50 stored in the storage device of the image server 42, and the selected image data is downloaded to the TV 45 (S6013, and 6008 in FIG. 25). In other words, the UID is used to select image data associated with the image capturing device 1 indicated by the UID, from among pieces of image data stored in the image server 42. A determination is made as to whether or not the image download is completed (S6014). If the image download is completed, the downloaded images are sequentially displayed as a slide show (S6015, and 6007, 6009, and 6010 in FIG. 25). The download-completion-time processing set instruction 6007 in FIG. 25 is instruction for setting processing to be performed when image downloading is completed. In the example of FIG. 25, the download-completion-time processing set instruction 6007 instructs the download-completion-time instruction 6009 as the processing to be performed when image downloading is completed. Moreover, the download-completion-time instruction 6009 calls the slide show display instruction 6010 for performing a slide show of the images.

It should be noted that, referring to FIGS. 23 and 24, it has been described that the operation program and the necessary information for the operation program are transferred from the image capturing device 1 to the TV 45 via the remote controller 827. However, the RF-ID reader/writer 46 of the remote controller 827 may be provided to the TV 45. In other words, the RF-ID reader/writer 46 may be embedded in the TV 45. Furthermore, the communication path connecting the reader (RF-ID reader/writer 46) to the apparatus may be a wireless communication path such as infrared communication path, or a wired signal cable.

It should also be noted that, in the above-described execution example, the UID is used to select image data associated with the image capturing device 1 from among pieces of image data stored in the image server 42. However, it is also possible to use the UID to identify the image server storing the image data. Here, it is assumed that, in a communication system including a plurality of image servers, UID is associated with an image server storing image data captured by an image capturing device identified by the UID. Under the assumption, if the operation program is created so that a URL of the image server can be identified with reference to the UID, the TV 45 executing the operation program can identify, by using the UID, the image server associated with the UID from the plurality of image servers and thereby download the image data from the identified image server.

It should also be noted that the identification information for identifying the image capturing device 1 is not limited to UID. The identification information maybe any other information regarding the image capturing device 1, such as a serial number, a product serial number, a Media Access Control (MAC) address, or information equivalent to the MAC address, for example, an Internet Protocol (IP) address. Moreover, if the image capturing device 1 serves as an access point on a wireless LAN, the identification information maybe a Service Set Identifier (SSID) or any information equivalent to SSID. It should also be noted that, in the above-described second memory 52, the identification information (UID unit 75) for identifying the image capturing device 1 has been described to be stored separately from the operation program 116. However, the identification information may be stored (described) in the operation program 116.

It should also be noted that the remote-controller signals (in other words, the communication path connecting the reader to the apparatus) are described to employ infrared ray. However, the remote-controller signals are limited to the above, but may employ a wireless communication method such as Bluetooth. The use of wireless communication that is generally speedier than infrared communication can shorten a time required to transfer an operation program and/or the like.

It should be noted that the operation program is not limited to the program in the format presented in FIG. 25. The operation program may be described in any other programming language. For example, the operation program described in Java™ can be easily executed by various apparatuses (devices), because the program execution circumstances called JavaVM™ have broad versatility. The operation program may be described in a compact programming language in a script format represented by Javascript™ so as to be stored in a small storage capacity. The operation program in such a compact programming language can be stored in the RF-ID unit 47 in the second memory 52 even if the RF-ID unit 47 has a small storage capacity. Moreover, the operation program may be in an executable format applied with processing such as compiling, rather than a source code presented in FIG. 25. The program can reduce a processing load on apparatuses having program execution environments.

Figure 26:
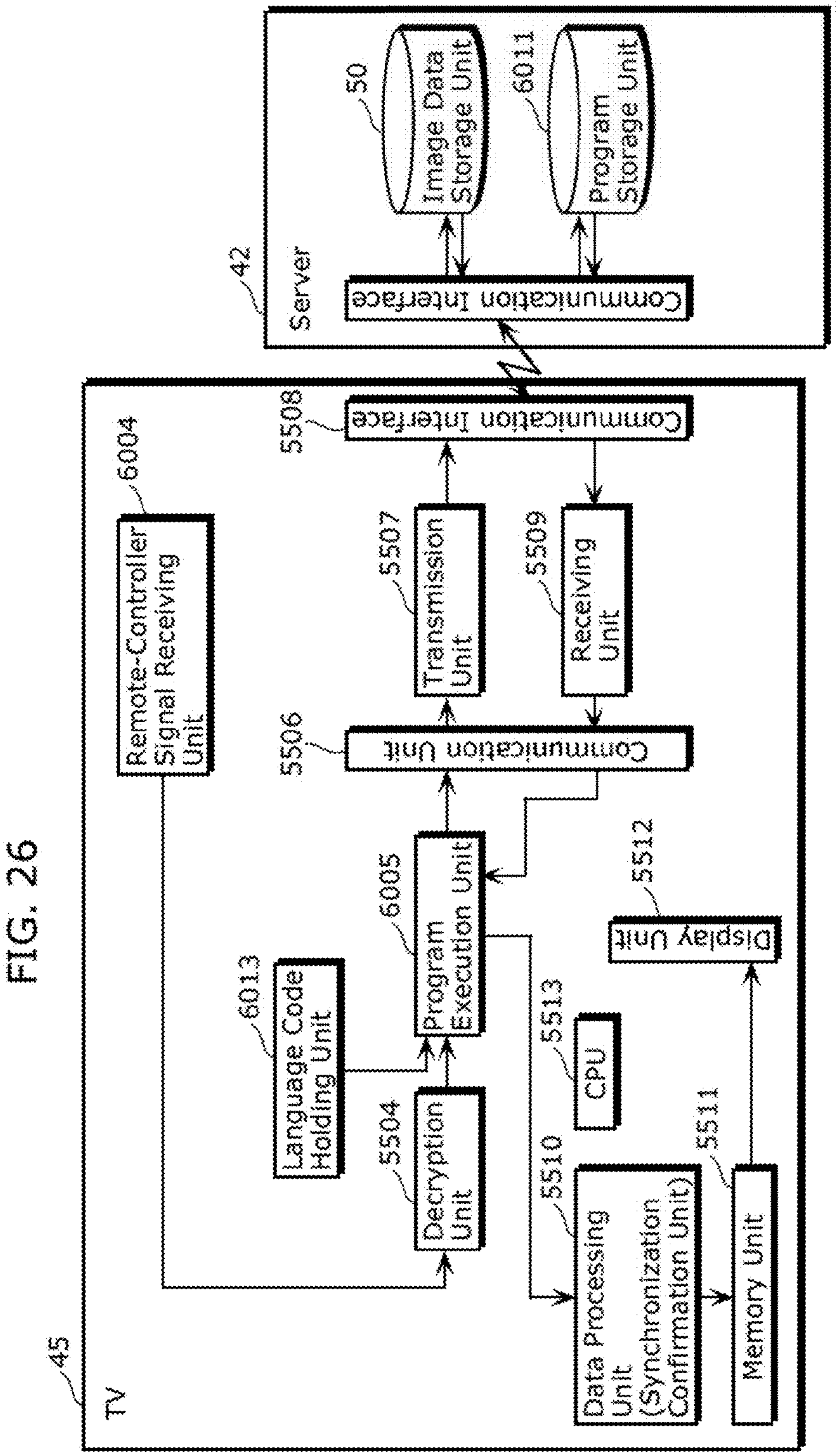
FIG. 26 is a block diagram of (a) the TV changing processing of the operation program according to a language code, and (b) a server storing the program.
Figure 27:
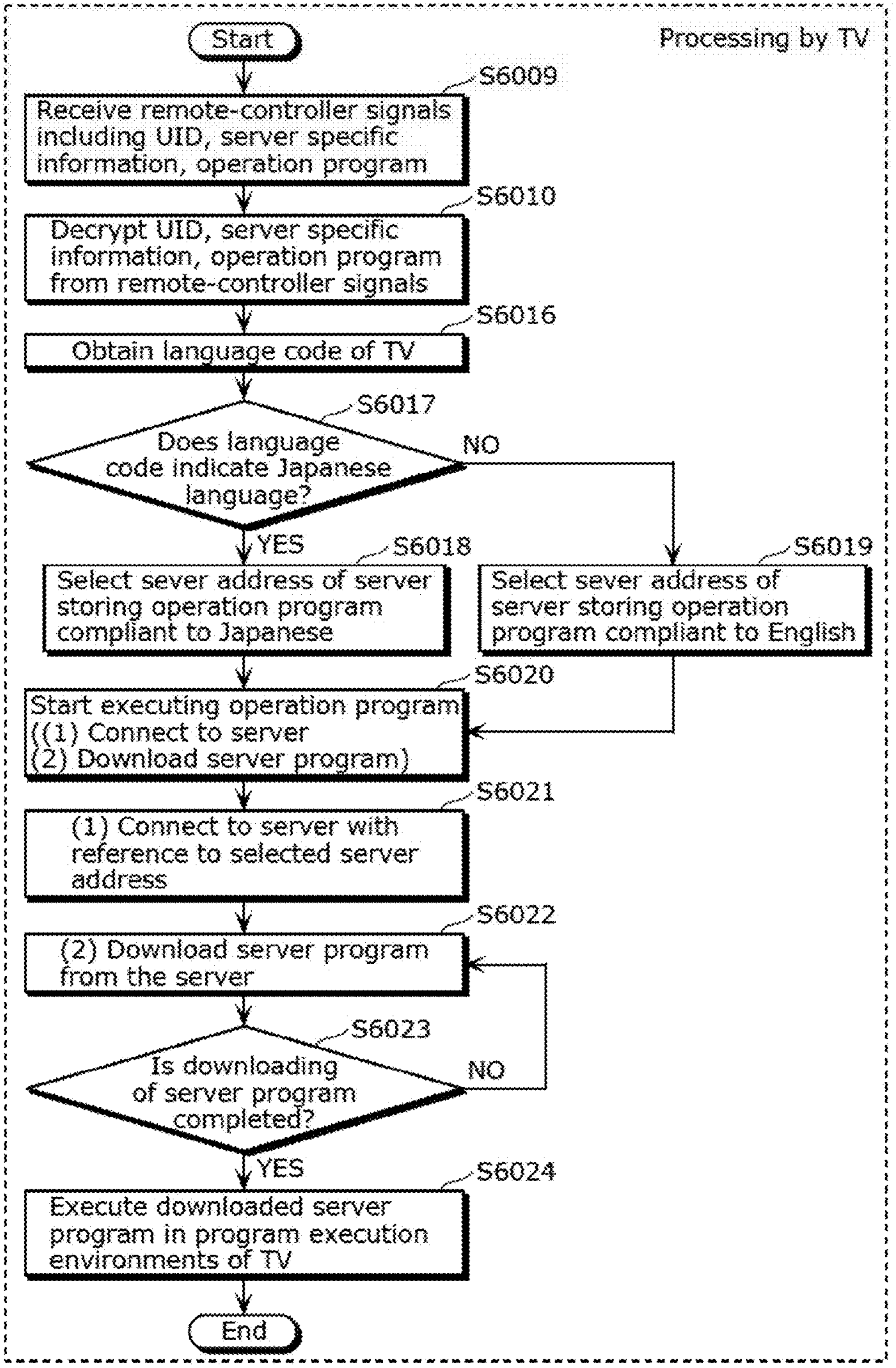
FIG. 27 is a flowchart of processing for changing processing of the operation program according to a language code.

The following describes, in detail, the processing of changing execution of a program depending on information unique to a display device (such as the TV 45) having a RF-ID reader, with reference to FIGS. 26 and 27.

The TV 45 illustrated in FIG. 26 further includes a language code holding unit 6013. When the operation program received as remote-controller signals is executed to connect the TV 45 to the server 42, the program execution unit 6005 reads a language code from the language code holding unit 6013 to connect the TV 45 to the server 42 compliant to the language code. Then, the operation program is executed to download a server program from the server 42, and executes the downloaded server program. For example, if the language code indicates Japanese language, the TV 45 is connected to the server 42 having a program storage unit 6011 in which a server program compliant to Japanese language is stored, and then the server program is obtained from the program storage unit 6011 to be executed in the TV 45. More specifically, the operation program stored in the RF-ID unit 47 of the image capturing device 1 as illustrated in FIG. 23 executes only connection to the server 42, while other processing such as image display is executed by the server program downloaded from the server 42.

The steps in the above processing are described with reference to FIG. 27. The processing by which the TV 45 receives the operation program and the necessary information for the operation program from the RF-ID unit 47 of the image capturing device 1 is the same as the processing described previously with reference to FIG. 24. In FIG. 27, it is assumed that the server specific information which the TV 45 receives as remote-controller signals includes two different server addresses which are (a) a sever address of a server 42 compliant to English and (a) a server address of a different server 42 compliant to Japanese. It is also assumed that the operation program which the TV 45 receives as remote-controller signals includes instruction for connecting the TV 45 to a server indicated by the server connection instruction 6006 in FIG. 25.

In the execution environments, the TV 45 obtains a language code of the TV 45 (S6016). The TV 45 determines whether or not the language code indicates Japanese language (S6017). If the language code indicates Japanese language, then the TV 45 selects, from the server specific information, a sever address of a server having a program storage unit 6011 storing an operation program for processing compliant to Japanese (S6018). On the other hand, if the language code does not indicate Japanese language, then the TV 45 selects, from the server specific information, a server address of a server having a program storage unit 6011 storing an operation program for processing compliant to English (S6019). Next, the TV 45 is connected to the server 42 with reference to the selected server address (S6021). The TV 45 downloads a server program from the server 42 (S6022, S6023). The TV 45 executes the downloaded server program in the program execution environments (for example, a virtual machine) of the TV 45 (S6024).

It should be noted that the use of the language code has been described in FIGS. 26 and 27, but the language code may be replaced by other information. Examples are a product serial number, a serial number of the display device (TV 45), and the like each of which indicates a country where the display device is on the market or equipped.

Figure 28:
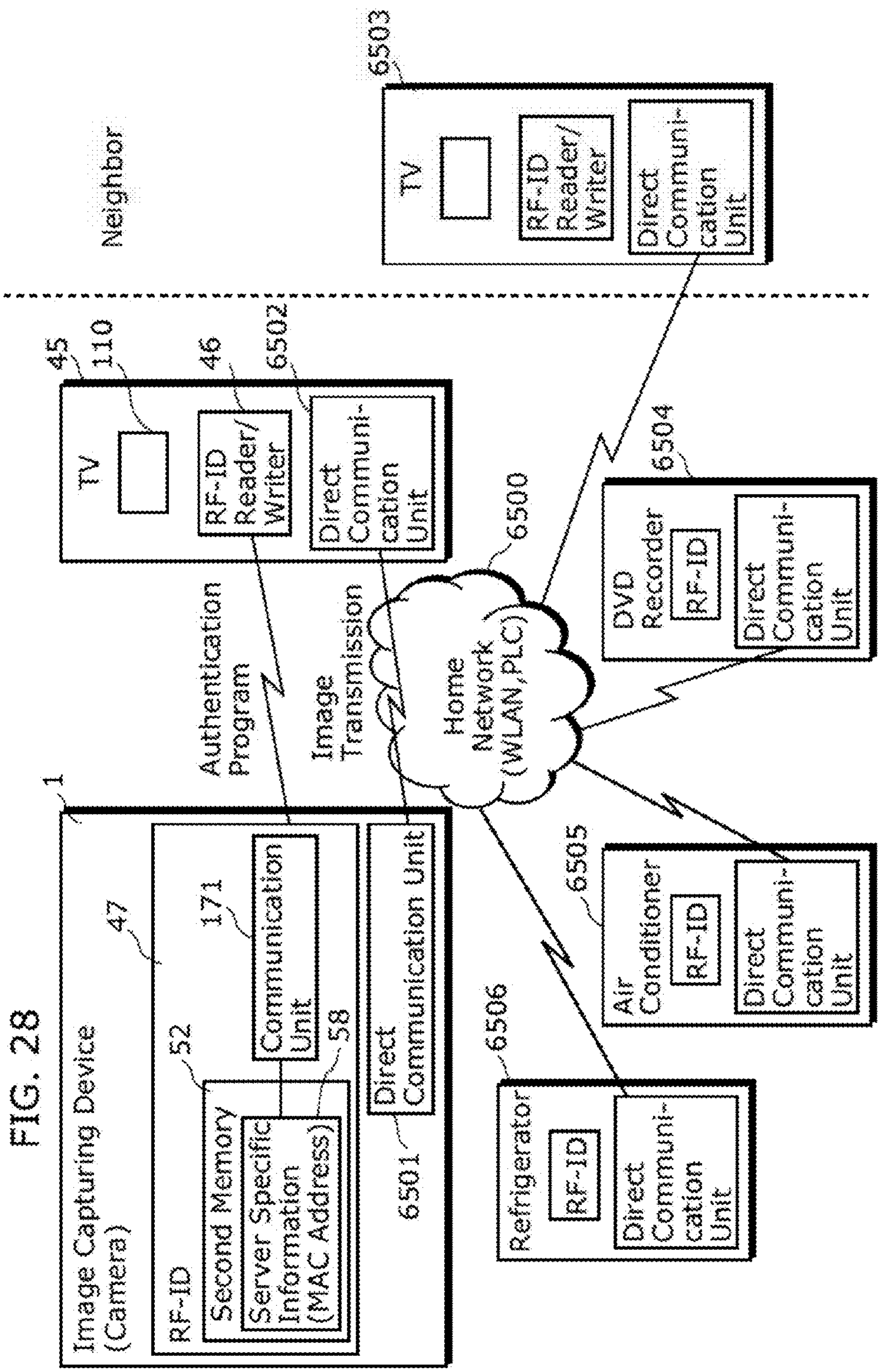
FIG. 28 is a block diagram of a home network 6500 connecting the image capturing device 1 to the TV 45 by a wireless LAN.

FIG. 28 illustrates a configuration of a home network 6500 in which the image capturing device 1 and the TV 45 are connected to each other via a wireless LAN or Power Line Communication (PLC). When the image capturing device 1 has a direct communication unit 6501 and the TV 45 has a direct communication unit 6502 so that the image capturing device 1 and the TV 45 can communicate directly with each other via the wireless LAN, the image capturing device 1 can transmit images to the TV 45 without using the server on the Internet. In other words, the image capturing device 1 serves also as a server. In this case, however, some communication mediums such as the wireless LAN used in the home network 6500 is easily intercepted by others. Therefore, safe data communication requires mutual authentication and exchange of encrypted data. For example, for existing wireless-LAN terminals (devices), access points serve as authentication terminals. If such an existing terminal is to authenticate its communication party, the terminal displays all connectable access points on its screen. The user selects one of the displayed access points from the screen. Then, the user presses a Wired Equivalent Privacy (WEP) key to perform encrypted communication. However, the above processing bothers general users. In addition, if a wireless LAN is embedded in home appliances such as a TV, there are so many terminals with which the existing terminal can communicate with authentication. If the user lives in an apartment house, the user can communicate even with terminals in neighbors. As a result, it is difficult for the user to select a terminal to be authenticated. For instance, if a neighbor has a TV 6503 that is the same model of the user's TV 45, the user has difficulty in distinguishing the TV 45 in the user's house from the TV 6503 based on the information displayed on the screen of the existing device.

Embodiment 1 of the present invention can solve the above problem. In Embodiment 1 of the present invention, RF-ID is used to perform authentication. In more detail, an authentication program including a MAC address 58 is recorded, as an operation program, in the second memory 52 in the RF-ID unit 47 of the image capturing device 1. When the image capturing device 1 is moved into proximity of the RF-ID reader/writer 46 of the TV 45, the image capturing device 1 provides the authentication program to the TV 45. The authentication program includes not only the MAC address but also a cryptography key for authentication (hereinafter, "authentication cryptography key") and an authentication command. When the TV 45 recognizes that the information provided from the RF-ID unit 47 includes the authentication command, the TV 45 performs authentication processing. The communication unit 171 in the RF-ID unit 47 cannot communicate with the TV 45, until the image capturing device 1 is physically located in proximity of the RF-ID reader/writer 46. Therefore, it is extremely difficult to intercept the communication between the image capturing device 1 and the TV 45 which is performed in a house. In addition, since the image capturing device 1 is moved into proximity of the TV 45 to exchange data, it is possible to prevent that the image capturing device 1 authenticates a wrong device (apparatus), such as the TV 6503 in a neighbor or a DVD recorder 6504 in the user's house.

Figure 29:
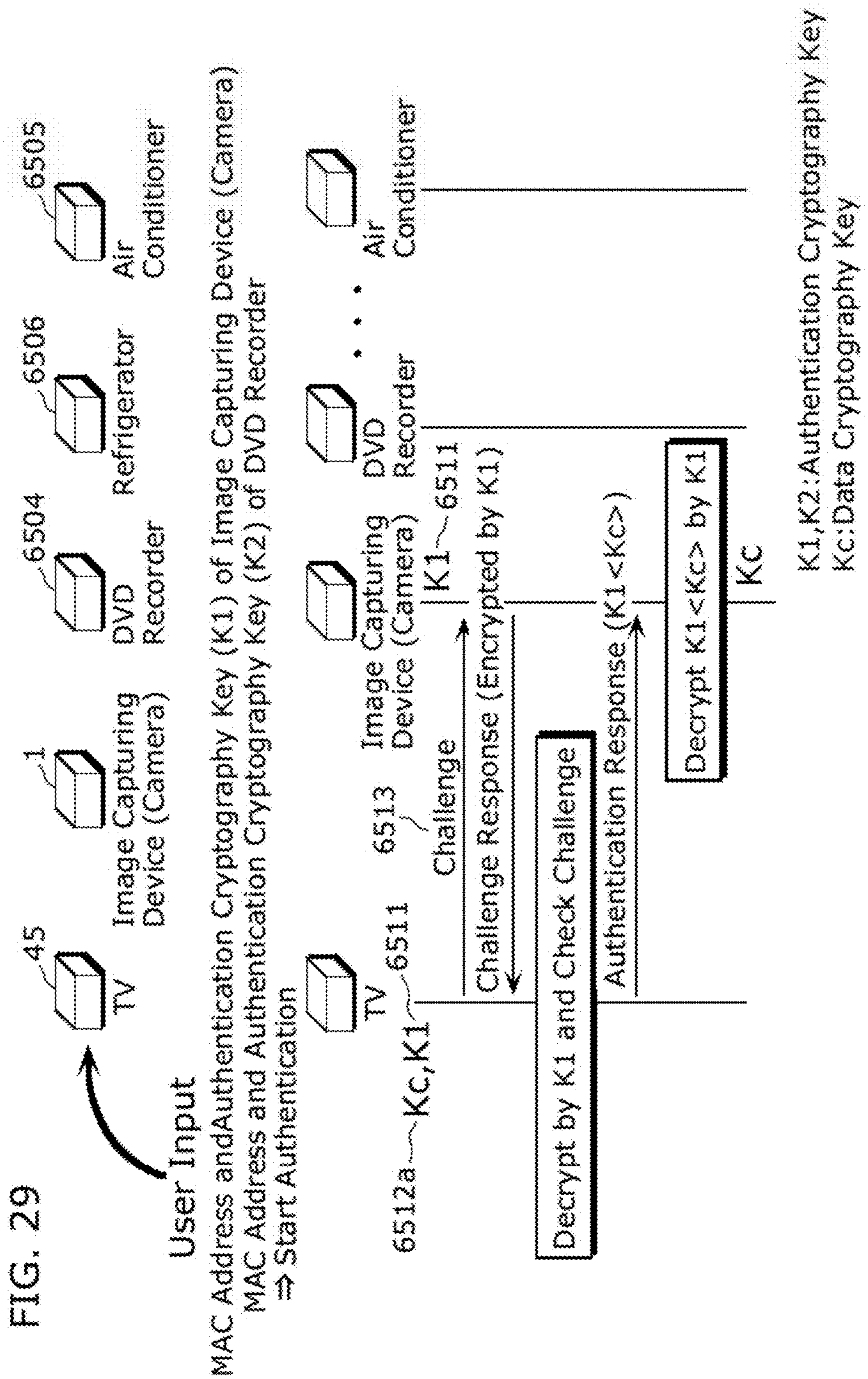
FIG. 29 presents an example of an authentication method without using RF-ID unit.

The following is an example of an authentication method without using RF-ID with reference to FIG. 29. A user inputs, to the TV 45, (a) MAC addresses of terminals to be authenticated, such as the camera (the image capturing device 1) and the DVD recorder 6504, which the user intends to authenticate for communication, and (b) authentication cryptography keys 6511 for the terminals. The TV 45 receiving the inputs transmits an appropriate message called a challenge 6513, to a target terminal having the MAC address. When the image capturing device 1 receives the challenge 6513, the image capturing device 1 encrypts the challenge 6513 using the authentication cryptography key 6511, and returns the encrypted challenge 6513 to the TV 45 that is a terminal from which the challenge 6513 has been provided. In receiving the encrypted challenge 6513, the TV 45 decrypts the encrypted challenge 6513 using the authentication cryptography key 6511. Thereby, the TV 45 can authenticate the authentication cryptography key 6511 to prevent user's error and intervention of other malicious users. Next, the TV 45 encrypts a cryptography key 6512*a* for data (hereinafter, a "data cryptography key 6512*a*") using the authentication cryptography key 6511. Then, the TV 45 transmits the encrypted data cryptography key 6512*a* to the image capturing device 1. Thereby, it is possible to perform the encrypted data communication between the TV 45 and the image capturing device 1. The TV 45 performs the above-described processing also with the DVD recorder 6504 and other apparatuses (terminals) 6505 and 6506 in order to share the data cryptography key 6512*a* among them. Thereby, the TV 45 can perform encrypted communication with all terminals (devices, apparatuses, or the like) connected in the home network.

Figure 30:
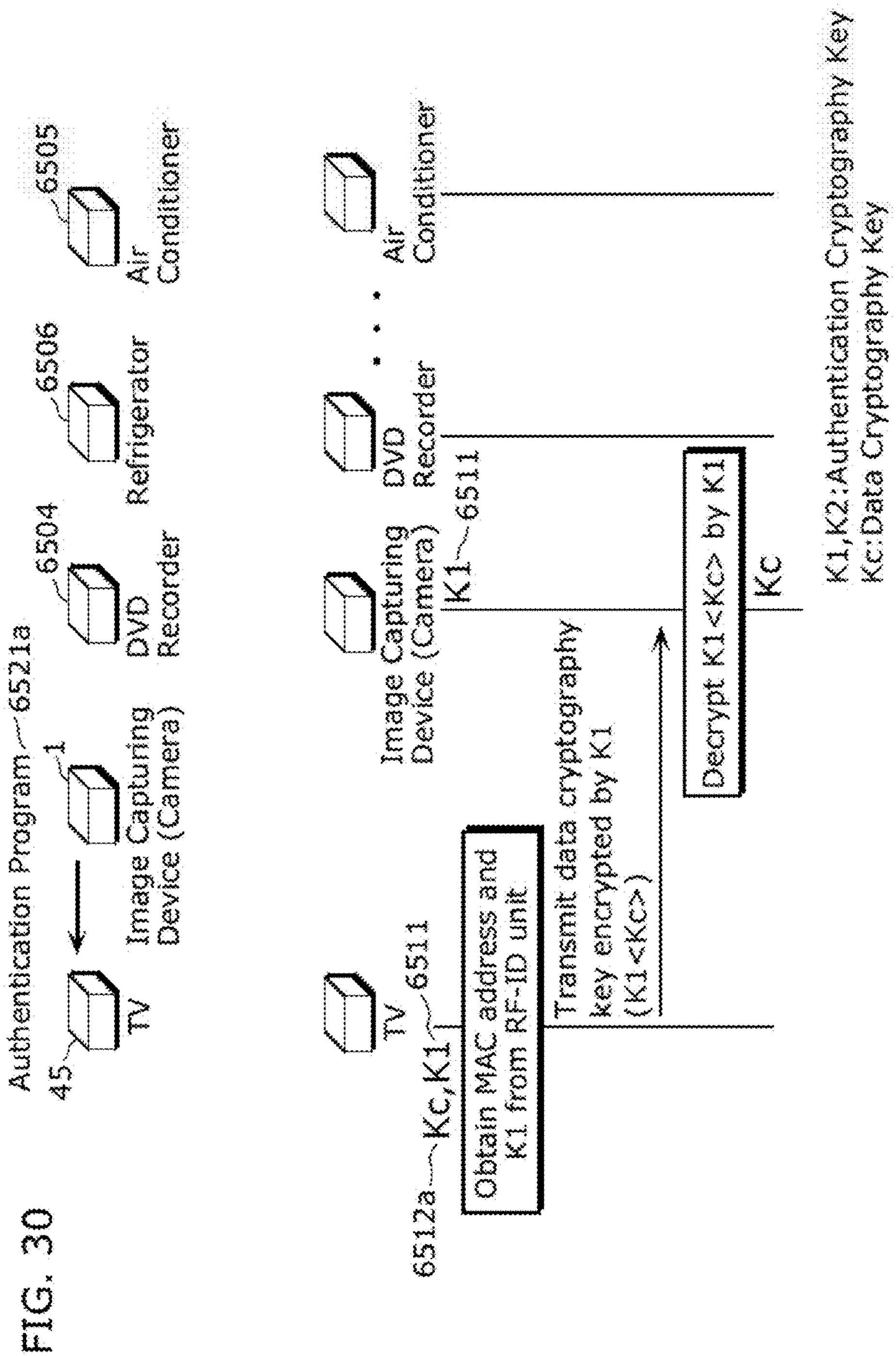
FIG. 30 presents an example of an authentication method using RF-ID unit.

On the other hand, FIG. 30 illustrates an authentication method using RF-ID. In the authentication method using RF-ID, the image capturing device 1 (camera) generates an authentication program 6521*a*. The camera provides the generated authentication program 6521*a* from the RF-ID unit 47 in the camera to a RF-ID unit 46 in the TV 45. The authentication program 6521*a* includes an authentication command, a MAC address of the camera, and an authentication cryptography key 6511 for the camera. When the TV receives the authentication program 6521*a* with the authentication command, the TV 45 retrieves the MAC address and the authentication cryptography key 6511 from the RF-ID unit 46. The TV 45 encrypts a data cryptography key 6512*a* using the retrieved authentication cryptography key 6511 and transmits the encrypted data cryptography key 6512*a* to the retrieved MAC address. The transmission is performed by a wireless-LAN device (terminal). In the authentication method using RF-ID, the authentication is performed automatically without any user's input. Therefore, there is no problem caused by user's input errors. In addition, since the image capturing device 1 (camera) needs to be moved into proximity of the TV 45, it is possible to prevent intervention of other malicious users. This authentication method using RF-ID can eliminate pre-processing such as the above-described challenge. Moreover, the action of physically moving the image capturing device 1 (camera) into proximity of the TV 45 enables the user to easily recognize which terminals the camera has authenticated. Furthermore, if the authentication cryptography key 6511 is not included in the authentication program, the authentication may be performed by a technique of general public key authentication. In addition, the communication device (medium) is not limited to a wireless LAN, but may be any medium, such as PLC or Ethernet™ included in the home network. Moreover, the MAC address may be any identification information for uniquely identifying a communication terminal in the home network.

Figure 31:
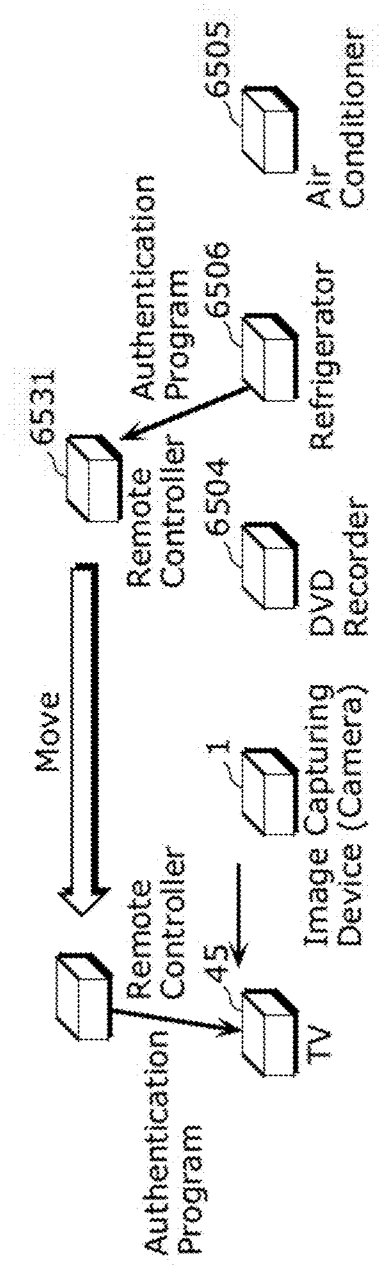
FIG. 31 presents an example of an authentication method used when it is difficult to move a terminal into proximity of another terminal.

FIG. 31 illustrates an authentication method using RF-ID when it is difficult to move a terminal into proximity of another terminal. For example, when the terminals are a refrigerator and a TV which are difficult to move, it is almost impossible to directly exchange an authentication program between the terminals using RF-ID. In such a situation, Embodiment 1 of the present invention can be implemented by relaying the authentication program between the terminals using a device (such as a remote controller 6531) that is an accessory of the terminal. In more detail, a RF-ID reader/writer embedded in the remote controller 6531 reads the authentication program from a RF-ID unit in the refrigerator. Thereby, the authentication program is stored in a memory in the remote controller 6531. A user moves the remote controller 6531 that is mobile. When the remote controller 6531 is moved into proximity of the TV 45, the remote controller 6531 transfers the authentication program from the memory of the remote controller 6531, to the RF-ID unit of the TV 45. It should be noted that the transfer from the remote controller 6531 to the TV 45 is not limited to use RF-ID technology. Other communication means, such as infrared ray or ZigBee, that is previously set in the remote controller 6531 can be used. Any medium for which security in communication has already been established may be used.

Figure 32:
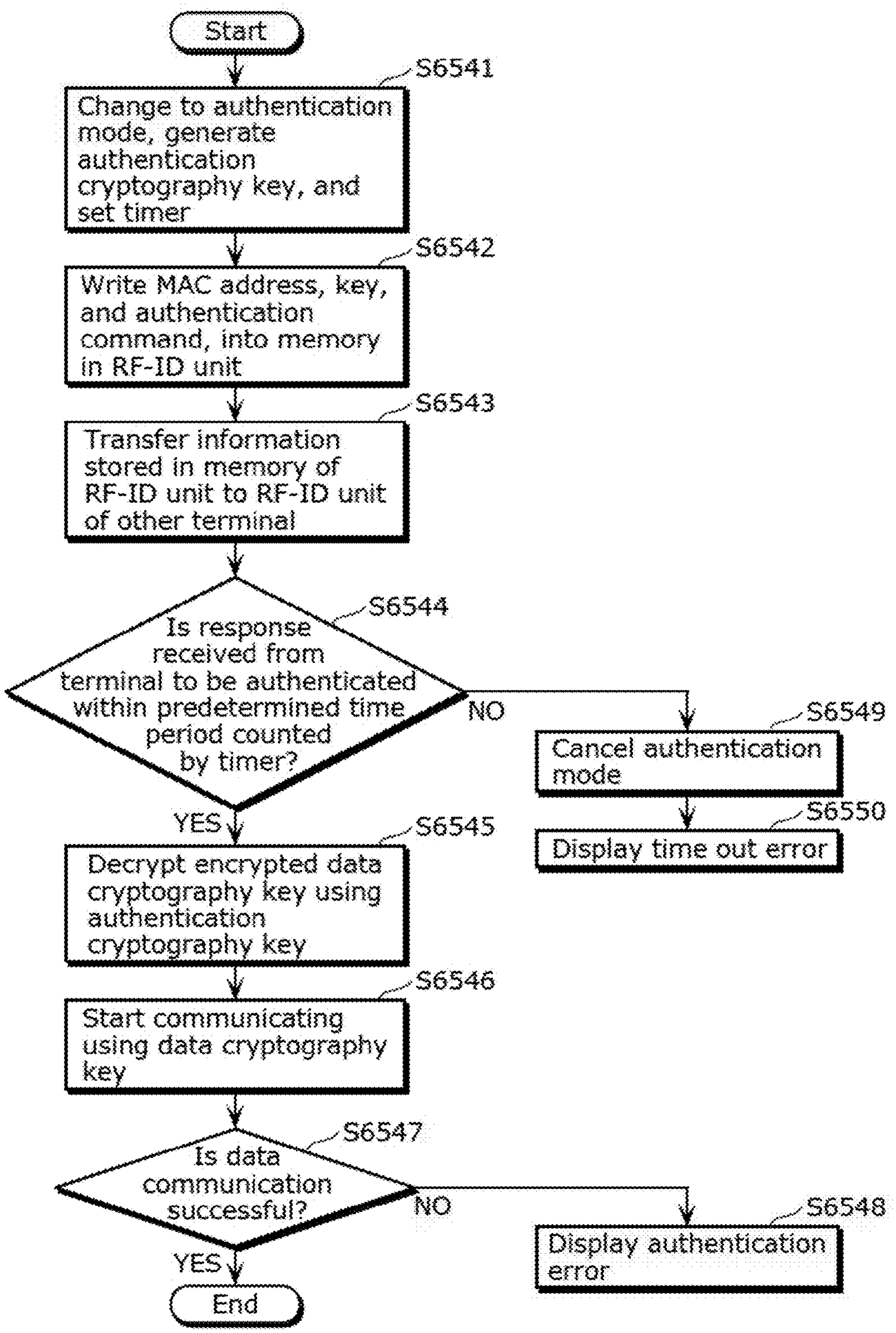
FIG. 32 is a flowchart of an example of processing performed by a camera.

FIG. 32 is a flowchart of authentication performed by the camera (image capturing device 1) side. In an authentication mode, the camera generates an authentication cryptography key and sets a timer (S6541). The camera writes a MAC address of the camera, the generated authentication cryptography key, and an authentication command, into a memory in the RF-ID unit (S6542). When the user moves the camera to bring the RF-ID unit of the camera into proximity of the RF-ID unit of the TV, the camera transfers the information stored in the memory of the RF-ID unit of the camera to the RF-ID unit of the TV (S6543). The camera determines whether or not a response of the transfer is received from the TV within a predetermined time period counted by the timer (S6544). If the response is received within the predetermined time period, then the camera decrypts, by using the authentication cryptography key, encrypted data cryptography key included in the response (S6545). The camera starts communicating with the other device (apparatus) using the data cryptography key (S6546). The camera determines whether or not data communication with the TV is successful (S6547). If the data communication is successful, then the authentication is completed. On the other hand, if data cannot be correctly decrypted (in other words, data communication is not successful), then a notification of authentication error is displayed and the authentication is terminated (S6548). Referring back to Step S6544, if there is no response within the predetermined time period, then the camera cancels the authentication mode (S6549) and then displays a notification of time out error (S6550).

Figure 33:
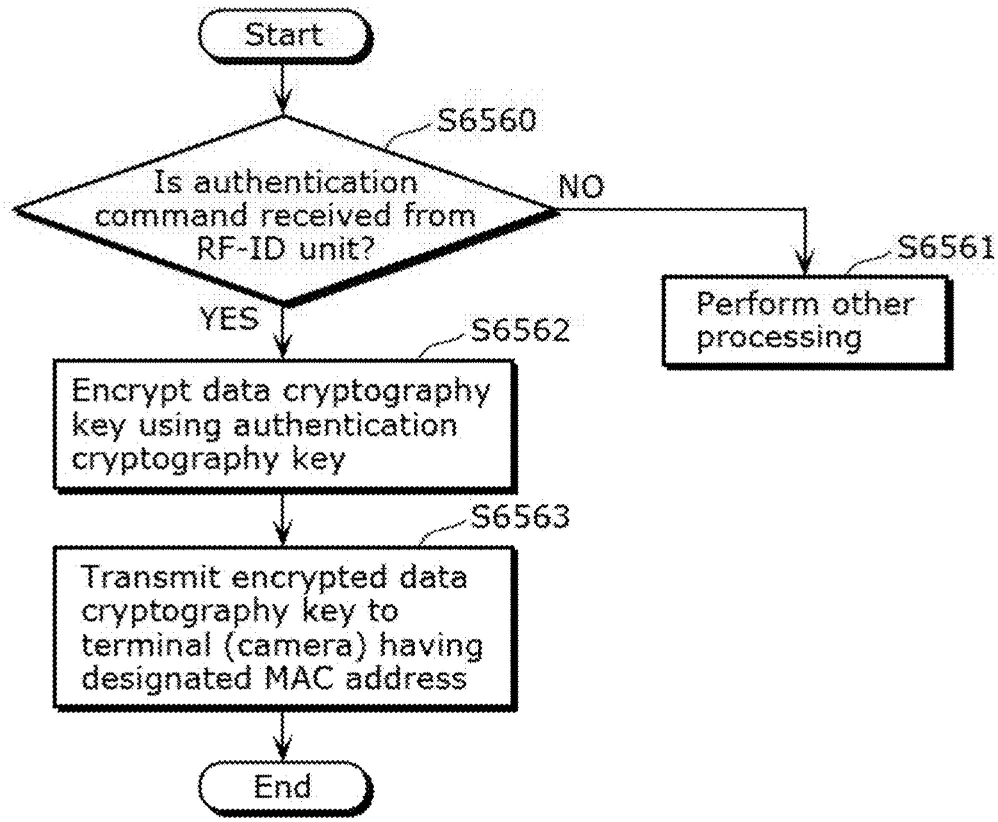
FIG. 33 is a flowchart of an example of processing performed by the TV.

FIG. 33 is a flowchart of authentication performed by the TV 45 side. The TV 45 determines whether or not received information, which is provided from the RF-ID unit of the camera to the RF-ID unit of the TV 45, includes an authentication command (S6560). If the received information does not include the authentication command, then the TV 45 performs other processing according to the received information (S6561). On the other hand, if the received information includes the authentication command, the TV 45 determines that the information received from the RF-ID unit of the camera is an authentication program, and therefore encrypts a data cryptography key in the TV 45 using an authentication cryptography key in the authentication program (S6562). Then, the TV 45 transmits the encrypted data cryptography key to the terminal (the camera) having the MAC address designated in the authentication program (S6563).

Next, the following situation is described in detail with reference to figures. Here, the image capturing device 1 described with reference to FIG. 3 generates or updates a program executable by the TV 45. Then, the image capturing device 1 transmits the program to the TV 45 via the data transmission unit 173. Thereby, the TV 45 executes the program.

Figure 34:
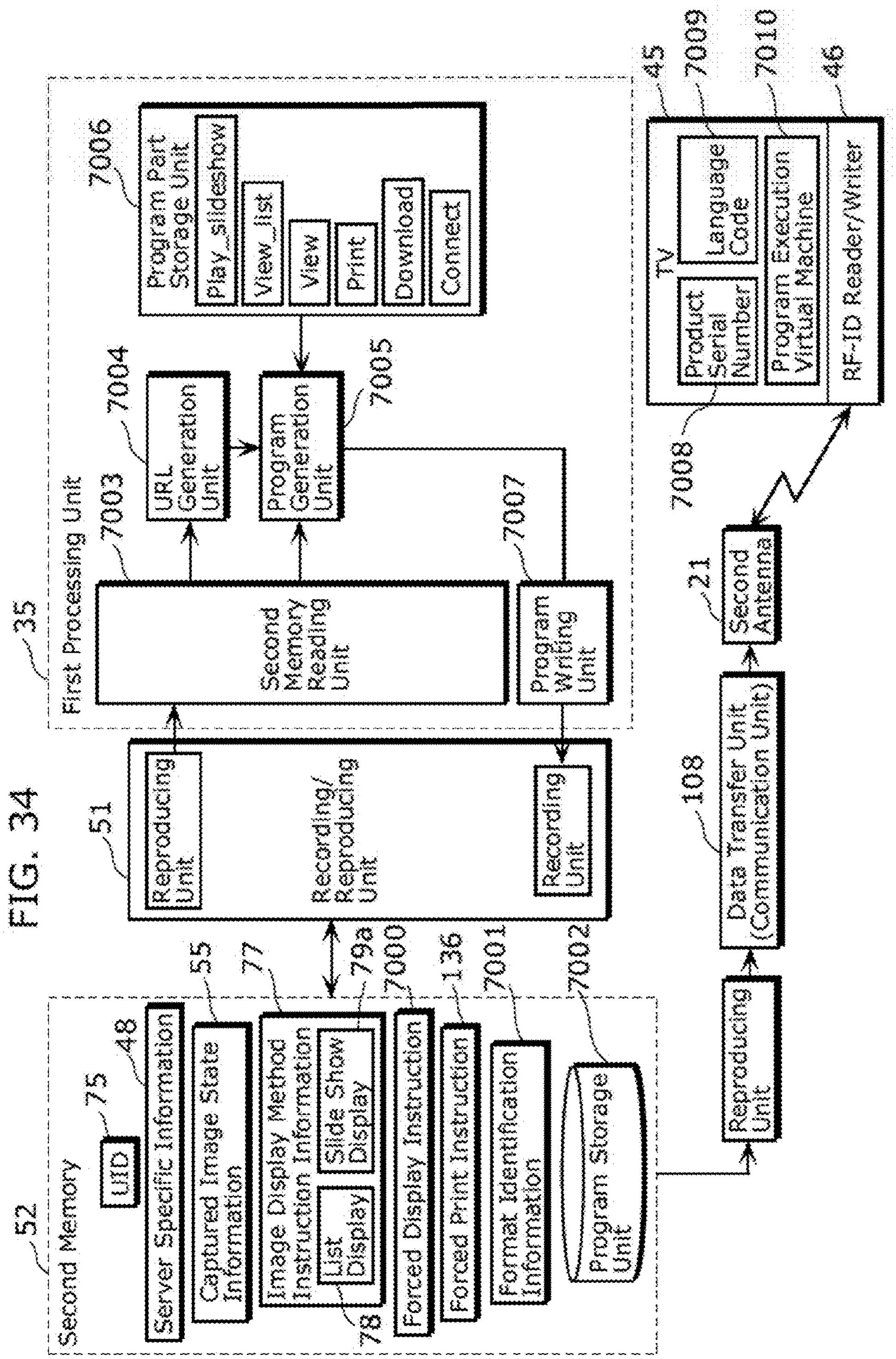
FIG. 34 is a block diagram of (a) a first processing unit generating the operation program in the image capturing device 1 to be executed by the TV, and (b) a second memory unit.

FIG. 34 is a block diagram of the first processing unit 35 and the second memory 52 of the image capturing device 1 according to Embodiment 1 of the present invention. The first processing unit 35 includes a second memory reading unit 7003, a URL generation unit 7004, a program generation unit 7005, a program part storage unit 7006, and a program writing unit 7007.

The second memory reading unit 7003 reads information from the second memory 52 via the recording/reproducing unit 51.

The URL generation unit 7004 reads the UID 75, the server specific information 48, the captured image state information 55, and the image display method instruction information 77 from the second memory 52 via the second memory reading unit 7003. From the above pieces of information, the URL generation unit 7004 generates a URL that is an address of the server 42 to which images have been uploaded from the image capturing device 1.

The UID 75 is identification information for identifying the image capturing device 1. The UID 75 is unique to each image capturing device 1. The URL generated by the URL generation unit 7004 includes UID. For instance, the image server 42, to which images are uploaded, has an image file in a directory unique to each UID. Thereby, a URL address can be generated for each image capturing device 1.

The server specific information 48 is a server name for identifying the server to which the images are uploaded. Via a Domain Name Server (DNS), an IP address of the server 42 is determined to connect the image capturing device 1 to the server 42. Therefore, the server specific information 48 is included in the generated URL.

The image display method instruction information 77 is information for enabling the user to optionally select the list display 78, the slide show display 79, or the like. The URL generation unit 7004 generates the URL based on the image display method instruction information 77. In other words, since the generated URL includes information indicating the list display 78 or the slide show display 79, the image server (the server 42) can determine based on the URL whether the images are to be displayed as the list display or the slide show display.

As described above, based on the UID 75, the server specific information 48, the captured image state information 55, the image display method instruction information 77, and the like which are stored in the second memory 52, the URL generation unit 7004 generates a URL of the image server in which images to be watched are stored. Then, the URL generation unit 7004 provides the generated URL to the program generation unit 7005.

The program generation unit 7005 generates a program executable by the TV 45, based on (a) the URI generated by the URL generation unit 7004, and (b) forced display instruction 7000, forced print instruction 136, and format identification information 7001 stored in the second memory 52. It should be noted that the program generation unit 7005 can generate a new operation program based on the above-described information, which is a method of generating a new operation program. The program generation unit 7005 can also generate such a new operation program by updating an operation program that has been already generated.

The program generated by the program generation unit 7005 is executable by the TV 45. The program should be compiled into a machine language used in a system controller (not shown) of the TV 45, so that the system controller can execute the program. In this case, the program generation unit 7005 has a compiler to convert the generated program to a program in an executable format.

However, the above-described compiler is not necessary if the program in a text format (script) (for example, a general Java™ script) is executed by a browser in the TV 45.

The URL provided to the program generation unit 7005 is used to connect the TV 45 to the image server (server 42) in which images are stored. By using the URL, the program generation unit 7005 generates or updates a connection program (hereinafter, referred to also as a "server connection program" or "connection program") for connecting the TV 45 to the image server.

The forced display instruction 7000 is optional and used in the following situation. For example, there is the situation where, while the user watches on the TV 45 a TV program provided by general broadcast waves, the RF-ID reader/writer 46 of the TV 45 becomes communicable with the image capturing device 1 via the second antenna 21. In the situation, the forced display instruction 7000 is used to automatically set the TV 45 into a browser watching mode so that image data provided from the image server is displayed on the TV 45. If this option is selected, the program generation unit 7005 generates a program for forcing the TV 45 to display image data.

The forced print instruction 136 is optional and used in the following situation. For example, there is the situation where, while the user watches on the TV 45 a TV program provided by general broadcast waves, the RF-ID reader/writer 46 of the TV 45 becomes communicable with the image capturing device 1 via the second antenna 21. In the situation, the forced print instruction 136 is used to automatically print image data stored in the image server by a printer (not shown) connected to the TV 45. If this option is selected, the program generation unit 7005 generates a program for forcing the TV 45 to print image data by the printer.

The format identification information 7001 is information of a format by which image data is to be displayed. When an option of language code optimization selection in the format identification information 7001 is selected, the program generation unit 7005 generates a program for selecting a URL to be connected, based on the language code set in the TV 45. The following is an example in the situation where the option of language code optimization selection in the format identification information 7001 is selected. If the language code of the TV 45 indicates Japanese language, the program generation unit 7005 selects a Japanese site as the URL to be connected. On the other hand, if the language code of the TV 45 does not indicate Japanese language, the program generation unit 7005 selects an English site as the URL to be connected. Or, the URL generation unit 7004 may generate two URLs for the Japanese site and the English site, and provide the two URLs to the program generation unit 7005.

The program part storage unit 7006 holds program command information used by the program generation unit 7005 to generate a program. A program part stored in the program part storage unit 7006 may be a general library or an Application Programming Interface (API). In order to generate a connection command for connecting the TV 45 to the server, the program generation unit 7005 combines a server connection command "Connect" in the program part storage unit 7006 with the URL generated by the URL generation unit 7004. Thereby, the program generation unit 7005 generates or updates a connection program for connecting the TV 45 to the server indicated by the URL.

The program writing unit 7007 is an interface used to write the program generated by the program generation unit 7005 to the second memory 52.

The program provided from the program writing unit 7007 is stored into a program storage unit 7002 in the second memory 52 via the recording/reproducing unit 51.

When the image capturing device 1 is moved to bring the RF-ID unit of the image capturing device 1 into proximity of the RF-ID reader/writer 46 connected to the TV 45, the reproducing unit reads out the program from the program storage unit 7002 in the second memory 52. Then, transmission signals indicating the program are transmitted to the RF-ID reader/writer 46 via the data transfer unit 108 and the second antenna 21. The TV 45 receives the transmission signals via the RF-ID reader/writer 46. The TV 45 executes the receives program.

The TV 45 has the product serial number 7008, the language code 7009, and a program execution virtual machine 7010.

The product serial number 7008 is a product serial number of the TV 45. From the product serial number 7008, it is possible to learn a manufacture date/time, a manufacture location, a manufacturing line, and a manufacturer of the TV 45.

The language code 7009 is predetermined in the TV 45 to be used in displaying a menu, for example. The language code 7009 is not limited to be predetermined, but can be switched to another by the user.

The program execution virtual machine 7010 is a virtual machine that executes a received program. The program execution virtual machine 7010 may be implemented as hardware or software. For example, the program execution virtual machine 7010 may be a Java™ virtual machine. The Java™ virtual machine is a stack or interpreter virtual machine that executes defined instruction sets. If the image capturing device 1 has the virtual machine, the program generated by the program generation unit 7005 in the image capturing device 1 is compliant to any execution platforms. As a result, the program generation unit 7005 can generate a program executable in any platforms.

Figure 35:
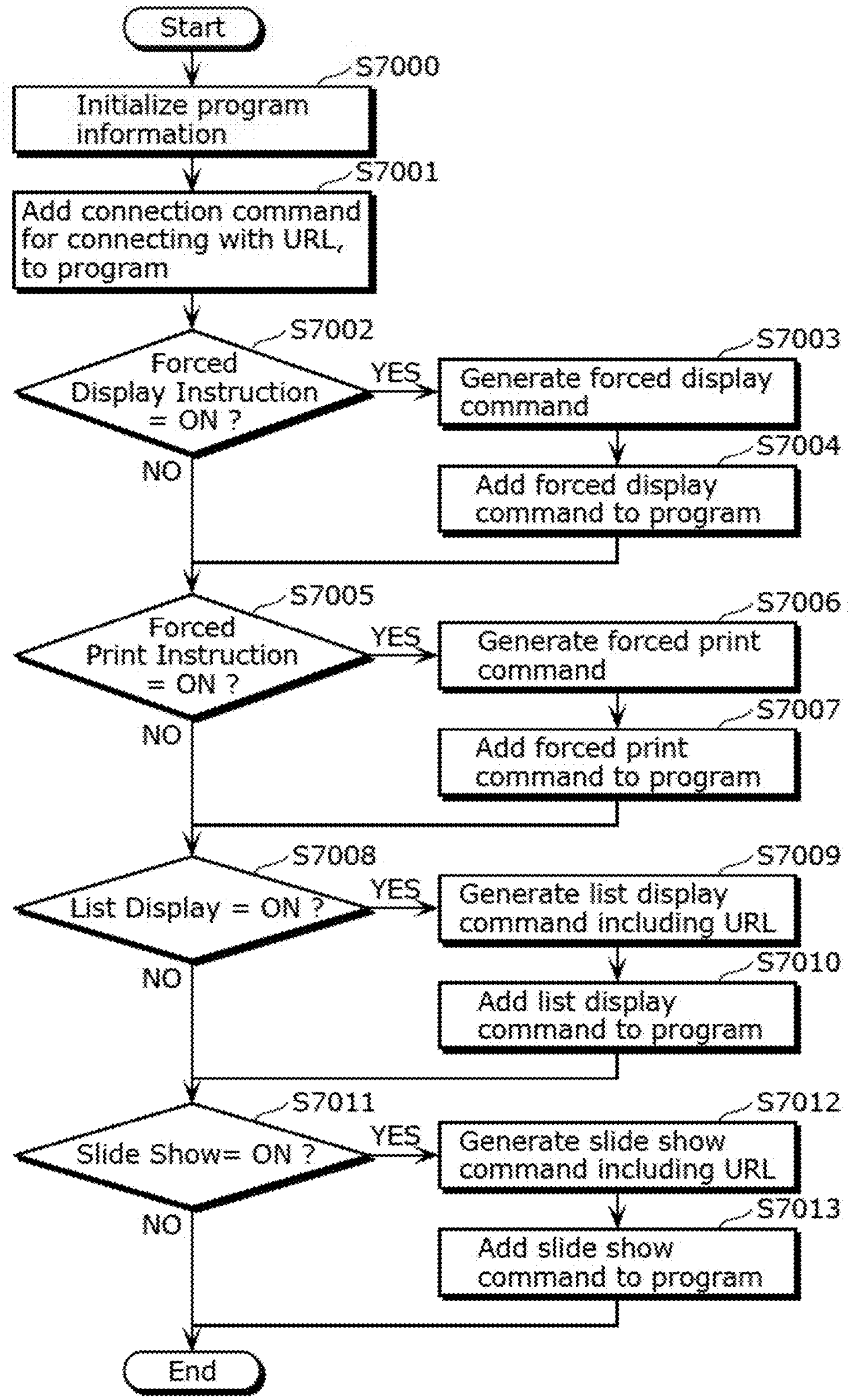
FIG. 35 is a flowchart of processing performed by a program generation unit 7005 in the first processing unit.

FIG. 35 is a flowchart of processing performed by the program generation unit 7005 of the image capturing device 1.

First, the program generation unit 7005 initializes information used to generate a program (S7000).

Next, based on the server specific information 48 stored in the second memory 52, the program generation unit 7005 generates a connection command for connecting the TV 45 to the server 42, by using the URL generated by the URL generation unit 7004. In order to generate the connection command, the program generation unit 7005 selects an instruction set (for example, "Connect" in FIG. 25) for a server connection command from the program part storage unit 7006, and combines the selected instruction set with the URL. Thereby, a server connection program (for example, "Connect (URL)") is generated.

Then, the program generation unit 7005 examines the forced display instruction 7000 in the second memory 52 so as to determine whether or not the forced display instruction 7000 is selected (S7002). If the forced display instruction 7000 is selected, then the program generation unit 7005 calls an instruction set for a forced display program from the program part storage unit 7006, and thereby generates a forced display command (S7003). The generated forced display command is added to the program (S7004).

On the other hand, if the forced display instruction 7000 is not selected, then the program generation unit 7005 does not generate the forced display command, but proceeds to S7005.

Next, the program generation unit 7005 makes a determination as to whether the forced print instruction in the second memory 52 is selected (S7005). If the forced print instruction is selected, then the program generation unit 7005 generates a forced print command for forcing the TV 45 to print, by a printer, an image file stored in the server 42 (S7006). The generated print command is added to the program (S7007).

Then, the program generation unit 7005 examines the image display method instruction information 77 in the second memory 52 so as to determine whether or not the list display 78 is selected (S7008). If the list display 78 is selected, then the program generation unit 7005 generates a list display command for causing the TV 45 to display a list of the image file stored in the server 42 (S7009). The generated list display command is added to the program (S7010).

After that, the program generation unit 7005 examines the image display method instruction information 77 in the second memory 52 so as to determine whether or not the slide show 79 is selected (S7011). If the slide show 79 is selected, then the program generation unit 7005 generates a slide show command for causing the TV 45 to display a slide show of the image file stored in the server 42 (S7012). The generated slide show command is added to the program (S7013).

As described above, based on the information set in the second memory 52, the program generation unit 7005 in the image capturing device 1 generates a program used to display images on the TV 45, by using an instruction command set that is stored in the program part storage unit 7006 to generate the program.

It should be noted that, in Embodiment 1, there are commands for the forced display instruction, the forced print instruction, the list display, and the slide show display. However, the commands (programs) are not limited to the above. For example, if a command for the forced display instruction is to be generated as a program, the program generation unit 7005 can also generate a determination command for determining whether or not the apparatus (device) executing the program has a display device or display function, and adds the generated determination command to the program. Thereby, the command for the forced display instruction is executed only if the apparatus executing the program has a display device or display function. As a result, the determination command can prevent confusion in the apparatus executing the program. The same goes for a command for the forced print instruction. It is preferable that the program generation unit 7005 also generates a determination command for determining whether or not the apparatus executing the program has or is connected to a printing function, and adds the generated determination command to the program. Thereby, the command for the forced print instruction is executed only if the apparatus executing the program has or is connected to a printing function.

The following describes execution of the program generated or updated by the program generation unit 7005 in the image capturing device 1.

Figure 36:
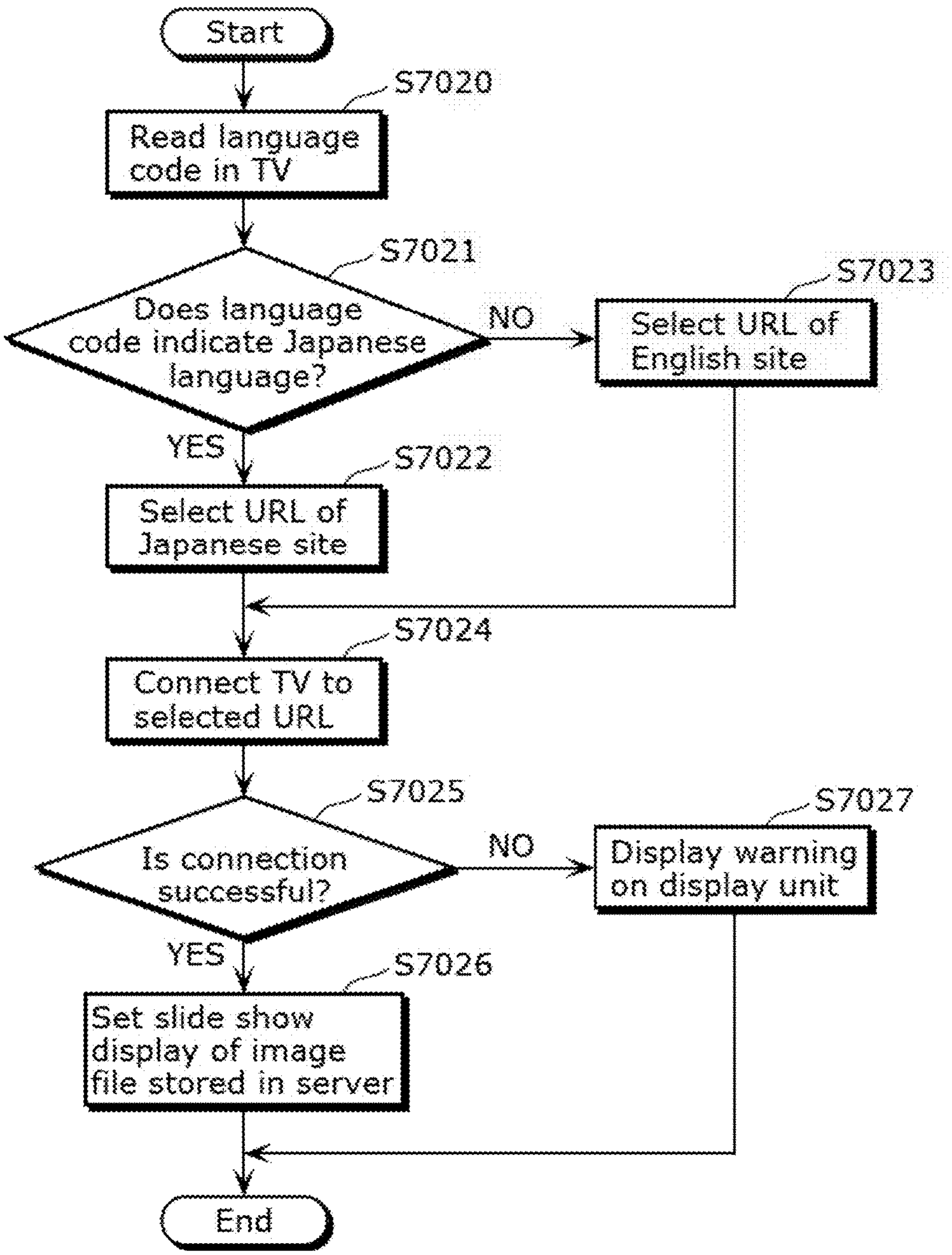
FIG. 36 is a flowchart of an example of a program generated by the program generation unit 7005.

FIG. 36 is a flowchart of execution of the program generated or updated by the program generation unit 7005. The program is transmitted from the image capturing device 1 to a device (apparatus) different from the image capturing device 1 via the second antenna 21 of the image capturing device 1. Then, the program is executed by the different device. In Embodiment 1, the different device is the TV 45. The TV 45 receives the program via the RF-ID reader/writer 46 and executes the received program by a controller or virtual machine (not shown) in the TV 45.

First, the program is executed to read the language code set in the TV 45, as unique information of the TV 45 (S7020). The language code is predetermined by the user to be used in displaying a menu and the like on the TV 45.

Next, the program is executed to determine a language indicated in the language code. First, a determination is made as to whether or not the language code indicates Japanese language (S7021). If the determination is made that the language code indicates Japanese language, then a connection command for a Japanese site is selected from the connection commands in the program (S7022). On the other hand, if the determination is made that the language code does not indicate Japanese language, then a connection command for an English site is selected from the connection commands in the program (S7023). It should be noted that it has been described in Embodiment 1 that a determination is made as to whether or not the language code indicates Japanese language, and thereby a connection command is selected from the connection command for connecting to a Japanese site and the connection command for connecting to an English command. However, it is also possible that the program includes a plurality of connection programs compliant to various language codes. Thereby, the program can be compliant to two or more language codes. As a result, usability is improved. Next, according to the selected connection command, the program is executed to connect the TV 45 to the URL indicted in the connection command (S7024).

Then, a determination is made as to whether or not the connection to the URL indicted in the connection command is successful (S7025). If the connection is failed, then the display unit of the TV 45 displays warning indicating the connection failure (S7027). On the other hand, if the connection is successful, then a command for displaying a slide show of an image file stored in the server is executed to display the slide show (S7026).

It should be noted that the above is the situation where the operation program is for displaying images as a slide show. However, the operation program is not limited to the above. The program may be used for performing list display, forced display, or forced printing. If the operation program is for forced display, a step (command) of automatically changing setting of the TV 45 to setting of displaying an image file stored in the server is added to the program. Thereby, the user does not need to change the setting of the TV 45 by manual in order to display images provided from the image server. In the case of the forced printing, a command for automatically changing setting of the TV 45 to a printable mode is added to the program. Moreover, in the case of each of the forced printing and forced display, a determination command for determining whether or not the TV 45 has a printing function or a displaying function is added to the program. Thereby, the forced print command is not executed in an apparatus (device) without a printing function. Furthermore, the operation program in Embodiment 1 of the present invention may be a connection program for leading other programs. For example, the operation program may be a loader program, such as a boot-loader for loading other programs to be executed.

As described above, Embodiment 1 of the present invention is characterized in that the program generation unit 7005 is included in the first processing unit 35 of the image capturing device 1 that is a device having RF-ID communication means (such as the data transfer unit 108 and the second antenna 21). It is also characterized in that the program generated or updated by the program generation unit 7005 is executed by a different device (apparatus) except the image capturing device 1 according to Embodiment 1 of the present invention that is a communication device having RF-ID.

Conventionally, a device having RF-ID needs to transfer ID information (tag information), which the device has, from a RF-ID communication unit to another device (for example, the TV 45 according to Embodiment 1 of the present invention). The device (apparatus) receiving the ID information should previously hold operation programs each unique to a corresponding device having RF-ID. Therefore, if new products having RF-ID technology appear, the receiving device needs to install an operation program corresponding to the new products and execute the program. Otherwise, the receiving device is excluded as not being compliant to the new products. The installation of operation programs requires technical knowledge. Not everyone can perform the installation. Therefore, if various new devices having RF-ID are produced, other devices such as the TV 45 of Embodiment 1 of the present invention become obsolete. As a result, property values of user's devices are damaged.

According to the disclosure of Embodiment 1 of the present invention, the device having RF-ID technology has the program generation unit 7005 and sends not ID information (tag information) but a program to another device (apparatus) such as the TV 45. The apparatus such as the TV 45 receives and executes the program. Therefore, the receiving apparatus does not need to previously have operation programs for various devices having RF-ID. Even if a new device having RF-ID technology appears, the receiving apparatus does not need to install a new program for the device. Therefore, usability is significantly improved.

Therefore, the terminal such as a TV does not need to previously have application programs for respective items, kinds, or application systems of various objects having RF-ID. Thereby, the terminal such as a TV does not need to previously have a storage device, either, for holding various application programs. In addition, maintenance such as version-up of the programs in the terminal is not necessary.

The program generated by the program generation unit 7005 is useful if it is executable in any execution platforms such as a Java™ language. Therefore, if the device (apparatus) such as the TV 45 executing programs has a Java™ virtual machine, programs generated by any devices (apparatuses) can be executed.

It should be noted that the program generation unit 7005 according to Embodiment 1 of the present invention may have a function of updating the program previously stored in the program storage unit 7003 of the second memory 52. The situation of updating a program produces the same advantages as that in the situation of generating a program. The generating or updating performed by the program generation unit 7005 may be generating or updating data used in executing a program by the TV 45. In general, the program includes additional initialization setting data. The additional data is used to switch an execution mode or to set a flag. Therefore, generating or updating of the additional data is equivalent to generating or updating of the program, without deviating from the inventive concepts of the present invention. This is because, for execution of a program, it depends on design whether a parameter for mode switching or the like is to be hold and read as data, or is to be included in the program to be executed. Therefore, when the program generation unit 7005 according to Embodiment 1 of the present invention generates or updates a program, the program generation unit 7005 can also generate data such a parameter sequence used by the program. The parameter is generated based on the forced display instruction 7000, the forced print instruction 136, the image display method instruction information 77, the format identification information 7001, or the like stored in the second memory 52.

The following describes characteristic structures and processing of the second memory 52 and the first processing unit 35 in the image capturing device 1 that is a communication device having RF-ID according to Embodiment 1 of the present invention. In Embodiment 1 of the present invention, the image capturing device 1 that is a communication device having RF-ID has a use status detection unit in the first processing unit 35. The use status detection unit detects a trouble related to operation, a power consumption status, or the like. The image capturing device 1 generates a program for displaying the result of the detection (use status) on the TV 45 that is a device (apparatus) different from the image capturing device 1.

Figure 37:
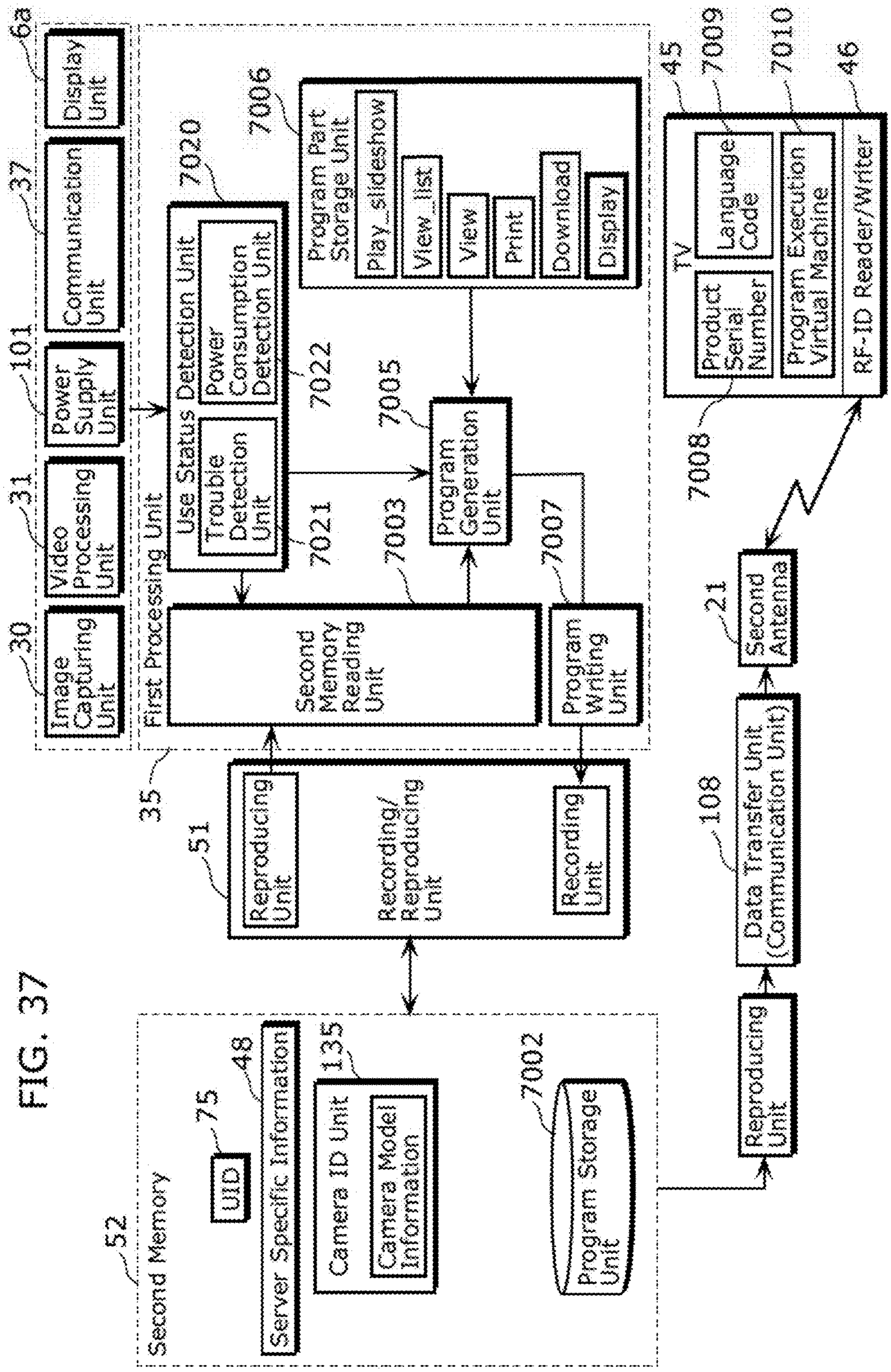
FIG. 37 is a block diagram of (a) the first processing unit generating the operation program in the image capturing device 1 to display a use status of the image capturing device 1, and (b) the second memory unit.

FIG. 37 is a block diagram of characteristic structures of the second memory 52 and the first processing unit 35 in the image capturing device 1 according to Embodiment 1 of the present invention.

The second memory 52 includes the UID 75, the server specific information 48, the camera ID 135, and the program storage unit 7002.

The UID 75 is a serial number unique to the image capturing device 1, and used to identify the single image capturing device 1.

The server specific information 48 is information for identifying the server 42 to which image data captured by the image capturing device 1 is transmitted by the communication unit 37. The server specific information 48 includes a sever address, a storing directory, a login account, a login passwords, and the like.

The camera ID 135 includes a product serial number, a manufacturing year/month/date, a manufacturer, a manufacturing line, a manufactured location, and the like of the image capturing device 1. The camera ID 135 also includes camera model information for identifying a model of the image capturing device 1.

The first processing unit 35 includes the second memory reading unit 7003, a use status detection unit 7020, the program generation unit 7005, the program part storage unit 7006, and the program writing unit 7007.

The second memory reading unit 7003 reads information from the second memory 52 via the recording/reproducing unit 51. In Embodiment 1 of the present invention, the second memory reading unit 7002 reads the UID 75, the server specific information 48, and the camera ID 135 from the second memory 52, and provides the pieces of information to the program generation unit 7005. Reading of the pieces of information from the second memory 52 is performed when a readout signal is provided from a use status detection unit 7020 that is described later.

The use status detection unit 7020 detects a use status of each unit included in the image capturing device 1. The use status detection unit 7020 includes sensors each detecting a trouble in operation of a corresponding unit included in the image capturing device 1. Results of the detection of the sensors in respective units are provided to the use status detection unit 7020. The sensors for the respective units provide the use status detection unit 7020 with trouble information, battery duration, a power consumption amount, and the like. For example, the image capturing unit 30 provides the use status detection unit 7020 with information indicating whether or not an image capturing operation of the image capturing unit 30 has any trouble (whether or not the image capturing unit 30 functions correctly, and whether or not the image capturing unit 30 responds to a call from the use status detection unit 7020). The video processing unit 31 provides the use status detection unit 7020 with information indicating whether or not data processing for image data captured by the image capturing unit 30 has any trouble (whether or not the video processing unit 31 functions correctly, and whether or not the video processing unit 31 responds to a call from the use status detection unit 7020). The first power supply unit 101 provides the use status detection unit 7020 with a voltage level of the battery and a total power consumption amount. The communication unit 37 provides the use status detection unit 7020 with information indicating whether or not the communication unit 37 is successfully connected to the server or the Internet (whether or not the communication unit 37 functions correctly, and whether or not the communication unit 37 responds to a call from the use status detection unit 7020). The display unit 6*a* provides the use status detection unit 7020 with information indicating whether or not display processing has any trouble, whether or not the display unit 6*a* correctly responds to a call from the use status detection unit 7020, and the display unit 6*a* functions correctly. Based on the above pieces of status information provided regarding the respective units, the internal trouble detection unit 7021 in the use status detection unit 7020 determines whether or not each of the units has any trouble in its functional operation. If there is a trouble, then the use status detection unit 7020 provides the program generation unit 7005 with information for specifying the trouble. The use status detection unit 7020 has a power consumption detection unit 7022. The power consumption detection unit 7022 generates power consumption information based on the total power consumption information provided form the power supply unit, and then provides the power consumption information to the program generation unit 7005.

The program generation unit 7005 generates a program for displaying, on the TV 45, the information for specifying a trouble or the power consumption information which is provided from the use state detection unit 7020. For generation of a program, instruction sets to be included in the program are previously stored in the program part storage unit 7006. Therefore, the program generation unit 7005 generates (a) a display command ("display" in FIG. 37) for displaying a trouble or a power consumption amount, and (b) a program for displaying information for specifying a location of the trouble and information for specifying the trouble in detail. It should be noted that the power consumption amount may be converted to a carbon dioxide emission amount, and therefore a program may be generated to display the carbon dioxide emission amount.

The program generated by the program generation unit 7005 is stored in the program storage unit 7002 in the second memory 52 via the program writing unit 7007.

The program stored in the program storage unit 7002 in the second memory 52 is transmitted to the RF-ID reader/writer 46 of the TV 45 via the data transfer unit 108 and then the second antenna 21.

The TV 45 executes the received program by the program execution virtual machine 7010.

With the above-described structure, the program generation unit 7005 in the first processing unit 35 generates a program for displaying, on the TV 45, trouble information or use status information detected by the use status detection unit 7020 regarding use of the image capturing device 1. The program is transmitted to the TV 45 that displays the trouble information or the use status information of the image capturing device 1. Thereby, the TV 45 can present the trouble information or the use status information to the user, without installing a plurality of programs compliant to various devices including the image capturing device 1.

In conventional systems, each of devices such as an image capturing device, a camcorder, an electric toothbrush, and a weight scale is provided with a simple display function such as a liquid crystal device, so as to display the trouble information or the use status information on the corresponding display function. Therefore, the display function has a low display capability for merely displaying the trouble information as a symbol sequence or an error code. When the trouble information is presented, the user needs to read instruction manual to check what kind of trouble it is. Some users have lost instruction manual and therefore obtain more information from an Internet site.

In the system according to Embodiment 1 of the present invention, however, a program for displaying trouble information can be executed by the TV 45 not by the image capturing device 1. The TV 45, which displays the trouble information detected by each device such as the image capturing device 1, has a display capability higher than that of the conventional systems. Therefore, the system according to Embodiment 1 of the present invention can solve the above conventional problem.

The following describes, in detail with reference to figures, the situation where a program generated by the image capturing device 1 described with reference to FIG. 3 is executed by a plurality of apparatuses (devices) including the TV 45.

Figure 38:
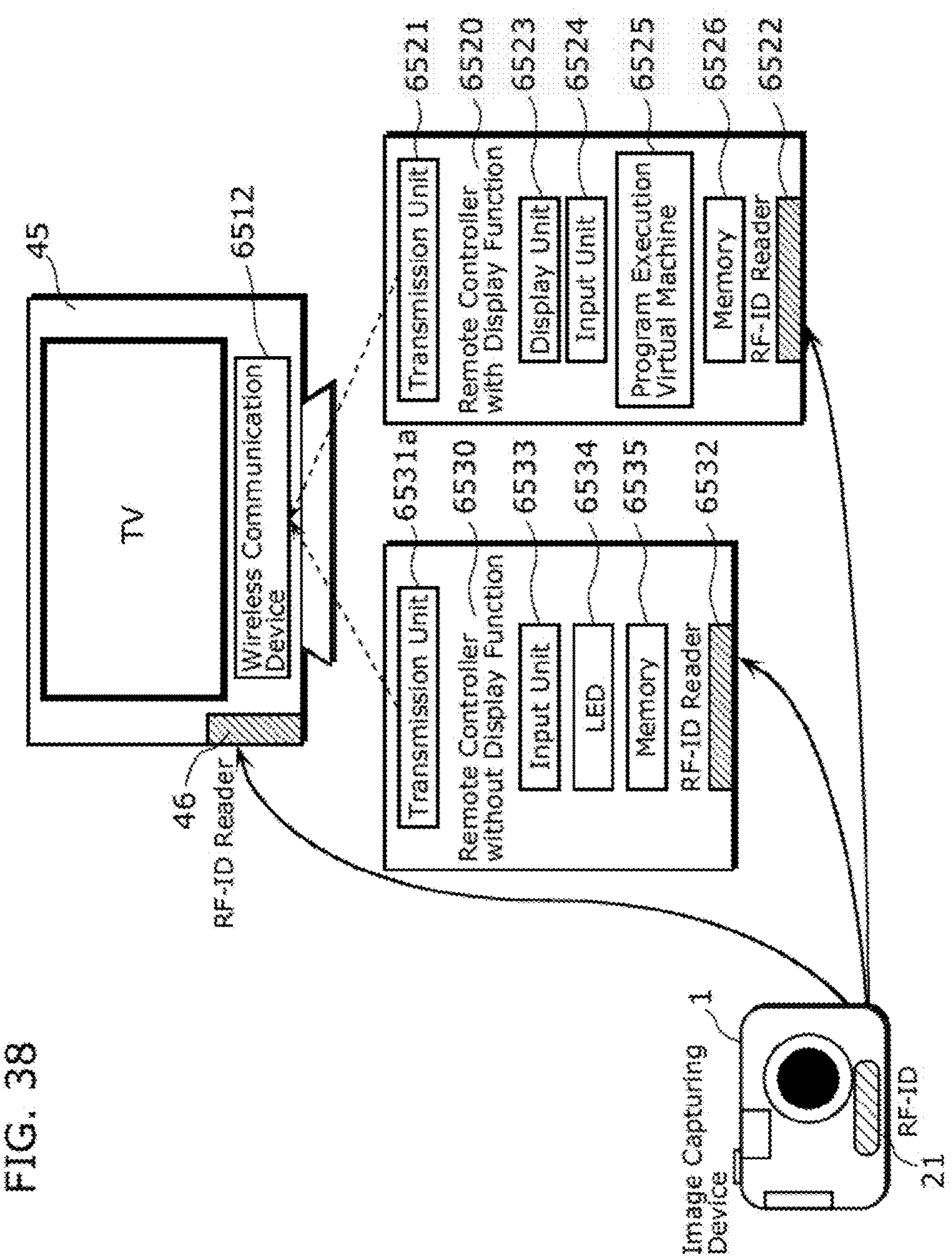
FIG. 38 illustrates a use example where the program generated by the image capturing device 1 is executed by an external device (apparatus).

FIG. 38 illustrates a system in which a program generated by the image capturing device 1 is executed by a plurality of apparatuses. The system includes the image capturing device 1, the TV 45, a remote controller (with display function) 6520, and a remote controller (without display function) 6530.

The TV 45 includes the RF-ID reader/writer 46 and a wireless communication device 6512. The wireless communication device 6512 is, for example, a general infrared communication device currently used as many remote controllers of home appliances, or a short-range wireless communication device used for home appliances using radio waves, such as Bluetooth and ZigBee.

The remote controller (with display function) 6520 includes a transmission unit 6521, a display unit 6523, an input unit 6524, a RF-ID reader 6522, a memory 6526, and a program execution virtual machine 6525. The transmission unit 6521 transmits signals to the wireless communication device 6512 of the TV 45. The display unit 6523 displays video. The input unit 6524 receives key inputs from a user. The RF-ID reader 6522 communicates with the RF-ID unit 47. The memory 6526 stores a program received by the RF-ID reader 6522. The program execution virtual machine 6525 is a virtual machine that executes the program received by the RF-ID reader 6522. For instance, recent mobile phones are example of the remote controller (with display function) 6520, having an infrared communication function, Bluetooth, a RF-ID reader, a liquid crystal display, a key input unit, a Java™ virtual machine, and the like. The display unit 6523 and the input unit 6524 may be a liquid crystal display and a plurality of character input buttons, or may be integrated into a liquid-crystal touch panel, for example.

The remote controller (without display function) 6530 includes a transmission unit 6531, an input unit 6533, a RF-ID reader 6532, and a memory 6535. The transmission unit 6531 transmits signals to the wireless communication device 6512 of the TV 45. The input unit 6533 such as buttons receives key inputs from a user. The RF-ID reader 6532 communicates with the RF-ID unit 47. The memory 6535 temporarily stores data received by the RF-ID reader 6532.

The remote controller (without display function) 6530 is, for example, a general remote controller having a RF-ID reader. Remote controllers are common accessory devices of TVs.

In Embodiment 1 of the present invention, there are the following four possible situations from which the user selects a preferred one. In the first situation, the program generated by the image capturing device 1 is transmitted directly to the TV 45 via the RF-ID reader/writer 46 of the TV 45, and executed by the TV 45. In the second situation, the program generated by the image capturing device 1 is transmitted indirectly to the TV 45 via the remote controller (without display function) 6530, and executed by the TV 45. In the third situation, the program generated by the image capturing device 1 is transmitted indirectly to the TV 45 via the remote controller (with display function) 6520, and executed by the TV 45. In the fourth situation, the program generated by the image capturing device 1 is transmitted to the remote controller (with display function) 6520, and executed by the remote controller (with display function) 6520.

The first situation has been already described above in Embodiment 1. Therefore, the first situation is not described again below.

The following describes the above second to fourth situations.

In the second situation, a program generated by the image capturing device 1 is executed by the TV 45, via the remote controller (without display function) 6530, such as general TV remote controllers, that does not have a graphical display device such as a liquid crystal panel.

When the user moves the image capturing device 1 to bring the RF-ID unit 47 to the RF-ID reader 6532, the RF-ID reader 6532 reads the program generated by the image capturing device 1 to store the program in the memory 6535.

Then, when the user presses the input unit 6533, the program held in the memory 6535 is transmitted from the transmission unit 6531 to the wireless communication device 6512 of the TV 45. The program execution virtual machine 7010 in the TV 45 executes the program. If the wireless communication device 6512 is a directional infrared communication device, the user presses the input unit 6533, facing the remote controller (without display function) 6530 to the TV 45. If the wireless communication device 6512 is a non-directional short-range wireless communication device, such as devices using Bluetooth or ZigBee, the program is transmitted to the TV 45 that is previously paired with the remote controller (without display function) 6530. In the case of the short-range wireless communication device, it is also possible that the program is automatically transmitted to the paired TV 45 when the RF-ID reader 6532 reads the program from the RF-ID unit 47, without user's pressing of the input unit 6533.

The remote controller (without display function) 6530 may have a display unit, such as a LED 6534, for notifying the user of that data read by the RF-ID reader 6532 is stored in the memory 6535. The LED 6534 is lit up to encourage the user to press the input unit 6533, when the program is read by the RF-ID reader 6532 and stored in the memory 6535. The LED 6534 is lit out when the transmission of the program to the TV 45 is completed. Thereby, it is possible to clearly notify the user of that the remote controller (without display function) holds the program. The LED 6534 may be an independent LED or integrated into the input unit 6533.

In the second situation, even if the user is far from the TV 45, the program can be executed by the TV 45 by using the remote controller (without display function) 6530 in the user's hand.

In the third and fourth situations, if the remote controller (with display function) 6520 has a program execution virtual machine as high-function mobile phones called smart phones do, the user can select whether the program generated by the image capturing device 1 is executed on the remote controller (with display function) 6520 or the program is transmitted to the TV 45 to be executed on the TV 45.

When the user moves the image capturing device 1 to bring the RF-ID unit 47 to the RF-ID reader 6522, the RF-ID reader 6522 reads the program generated by the image capturing device 1 to store the program in the memory 6535.

Figure 39:
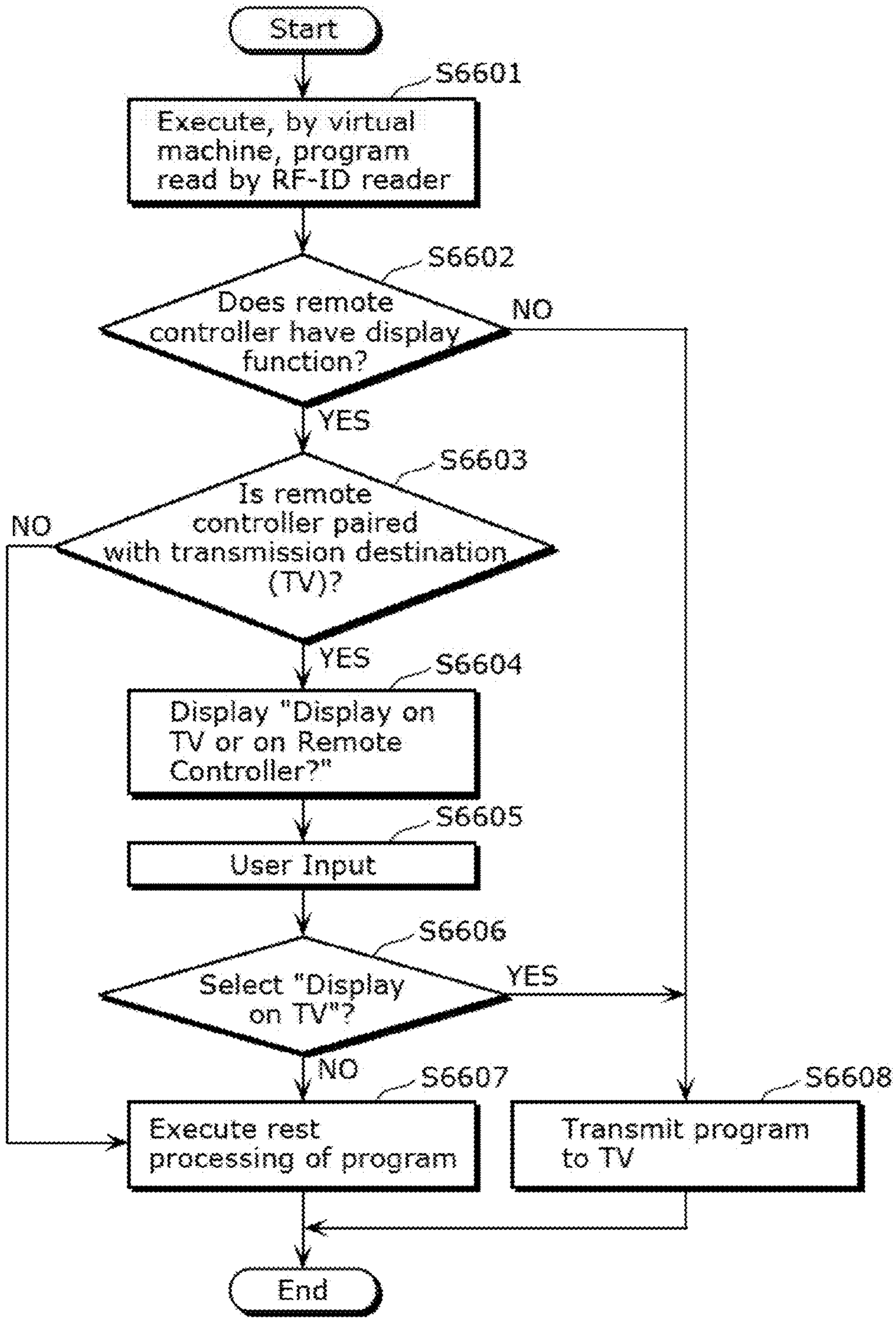
FIG. 39 is a flowchart in the case where the program generated by the image capturing device 1 is executed by a remote controller with display function.

The following describes the processing performed by the remote controller (with display function) 6520 in more detail with reference to a flowchart of FIG. 39.

First, a program read by the RF-ID reader 6522 is transmitted to the program execution virtual machine 6525 and executed by the program execution virtual machine 6525 (S6601).

Next, a determination is made as to whether or not the remote controller 6520 has a display function (S6602). If the remote controller 6520 does not have any display function (N at S6602), then the program is transmitted to the TV 45 via the transmission unit 6521 and then the processing is completed. In this situation, the program is executed by the TV 45.

If the remote controller 6520 has a display function (Y at S6602), then a further determination is made as to whether or not the remote controller 6520 is paired with the TV 45 that is a transmission destination (S6603). If the remote controller 6520 is not paired with the TV 45 (N at S6603), then a rest processing of the program is executed by the display unit 6523 of the remote controller 6520. On the other hand, if the remote controller 6520 is paired with the TV 45 (Y at S6603), then the display unit 6523 displays a dialog message "Display on TV or on Remote Controller?" to encourage the user to select one of the options (S6604).

Then, the remote controller 6520 receives user's entry by the input unit 6524 (S6605). A determination is made as to whether or the user selects to display data on the TV 45 (S6606). If the user selects the TV 45 to display data (Y at S6606), then the program is transmitted to the TV 45 via the transmission unit 6521 and thereby the processing is completed. In this situation, the program is executed by the TV 45. On the other hand, if the user selects the remote controller to display data (N at S6606), then a rest processing of the program is executed by the remote controller 6520 using the display unit 6523 (S6607).

It should be noted that the "rest processing of the program" refers to displaying of a status of a battery, a trouble status, or an instruction manual regarding the image capturing device 1, but, of course, not limited to those described in Embodiment 1.

With the above structure, a program generated by the image capturing device 1 is transmitted to the remote controller with display function, then a capability of the remote controller with display function is examined, and a determination is made by the remote controller as to which apparatus (device) is to execute rest processing of the program. Thereby, the remote controller does not need to previously install various programs compliant to a plurality of apparatuses. The user can execute the program in his/her preferred manner.

It should be noted that it has been described in Embodiment 1 that the determination is made based on whether or not the remote controller has a display function and based on a pairing status of the remote controller. However, it is not limited to the above. A program may execute any determination based on a capability of the apparatus, such as a communication capability, an audio-video reproduction capability, a capability of an input unit, a capability of an output device, and the like.

As described above, the storage region of the RF-ID unit holds not only information but also a program describing operations of an apparatus (device). This considerably simplify changing or updating of a program, which has been necessary for conventional techniques to change operations of apparatuses. In addition, it is possible to deal with addition of various new functions and an increase of cooperative apparatuses. Moreover, proximity communication using RF-ID technology is a simple operation achieved by simply bringing a device into proximity of an apparatus, which the user can easily understand. Therefore, conventional bothersome device operations by using buttons and a menu are simplified. As a result, the complicated device operations are changed to be convenient.

[Embodiment 2]

The following describes Embodiment 2 of the present invention. In Embodiment 2, actual operations of the communication system are described. In the communication system, images captured by a camera are uploaded to a server, and then downloaded by a simple operation to a TV to be displayed. The whole configuration of the communication system according to Embodiment 2 is the same as that of the communication system according to Embodiment 1.

Figure 40A:
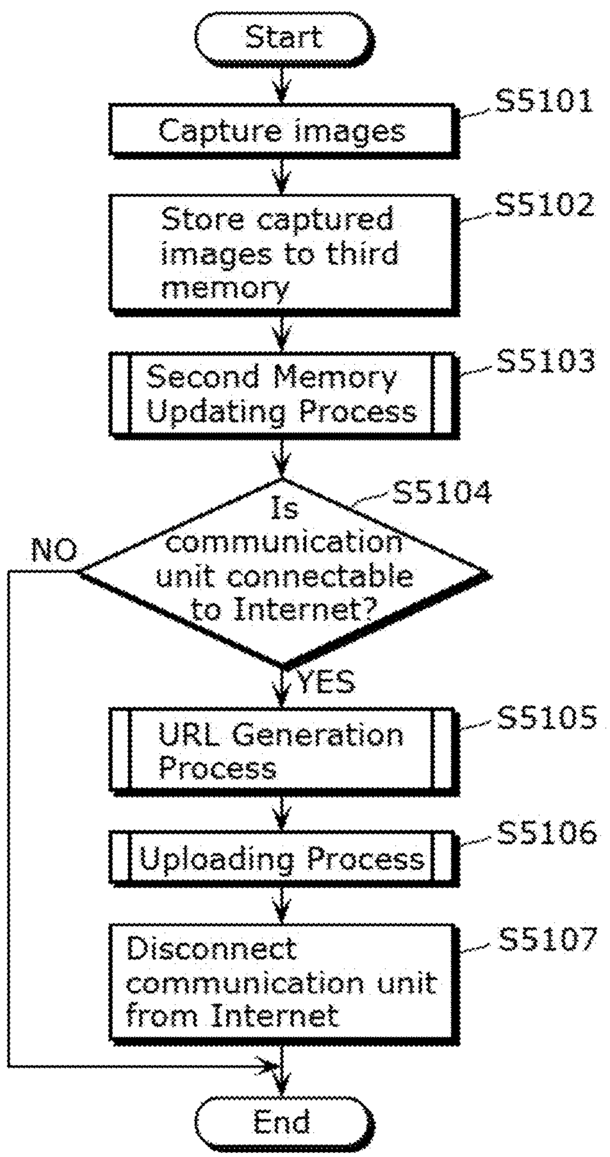
FIG. 40A is a flowchart of uploading steps in a camera according to Embodiment 2 of the present invention.

FIGS. 40A, 40B, and 40C are flowcharts of processing performed by a camera (the image capturing device 1) to upload photographs (images). First, the camera captures images (Step S5101). Then, the captured images are stored into the third memory (Step S5102). Then, the camera updates information stored in the second memory (Step S5103). The second memory updating process will be described later. Next, the camera determines whether or not the communication unit is connectable to the Internet (Step S5104). If connectable, then the camera generates a URL (Step S5105). The URL generation process will be described in more detail later. After generating the URL, the camera uploads the captured images (Step S5106). In completing the uploading process, the camera disconnects the communication unit from the Internet (Step S5107). As a result, the processing is completed. The uploading process will be described in more detail later.

The second memory updating process of Step S5103 enables the server 42 and the camera to share identification information for distinguishing photographs that have already been uploaded to the server 42 from photographs that have not yet been uploaded to the server 42. Examples of the uploading process in Step S5106 are given as following cases 1 to 4.

In case 1, the final capturing time (final capturing date/time) 68 is previously stored in the second memory, and then updated after the captured images are stored into the third memory (Step S5111).

Comparison of a time of uploading the captured images to the final capturing time 68 of the camera allows the server 42 and the camera to share identification information of the uploaded photographs.

In case 2, the above advantages can be produced also by generating existence identifiers 64 of images not yet been uploaded to the server 42, with reference to images uploaded to the server 42 among the captured images, and storing the generated existence identifiers 64 into the second memory (Step S5121).

In case 3, it is also possible that the not-yet-uploaded image information hashed information 67 is stored in the second memory (Step S5131). Thereby, an amount of the information stored in the second memory is reduced, thereby saving a capacity of the second memory.

In case 4, it is further possible that image serial numbers are chronologically generated for captured images, and thereby the final image serial number 69 in the second memory is updated (Step S5141). Thereby, even if a time counted by the camera is not correct, it is possible to synchronize information of uploaded photographs between the server 42 and the camera.

Figure 41:
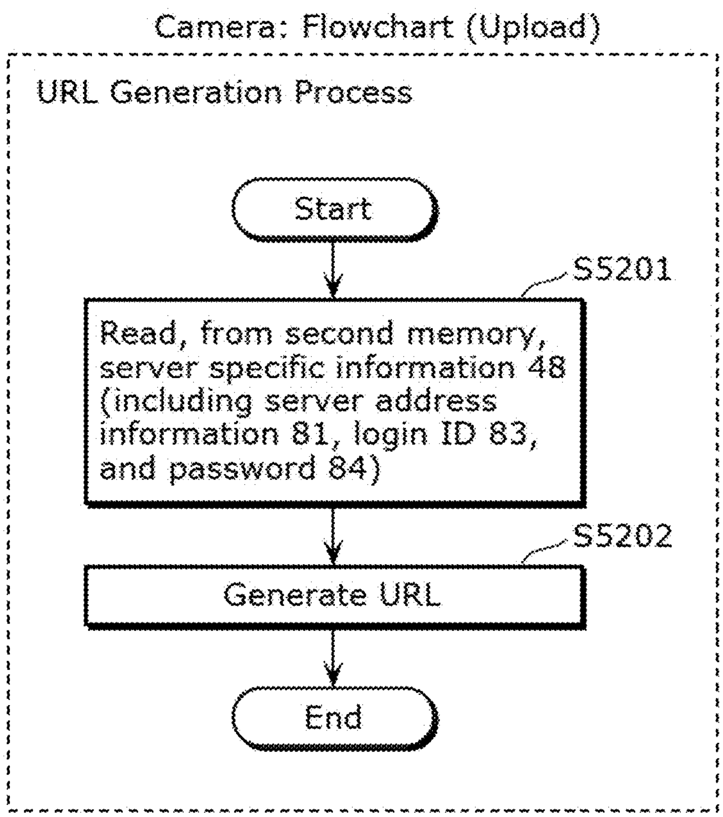
FIG. 41 is a flowchart of uploading steps in the camera according to Embodiment 2 of the present invention.

FIG. 41 depicts details of the URL generation process in Step S5105. The camera reads, from the second memory, the server specific information 48 including the server address information 81, the login ID 83, and the password 84 (Step S5201). Based on the server specific information 48, the camera generates a URL (Step S5202).

FIGS. 42A, 42B, 42C, and 42D depict details of the uploading process in Step S5106.

Figure 42A:
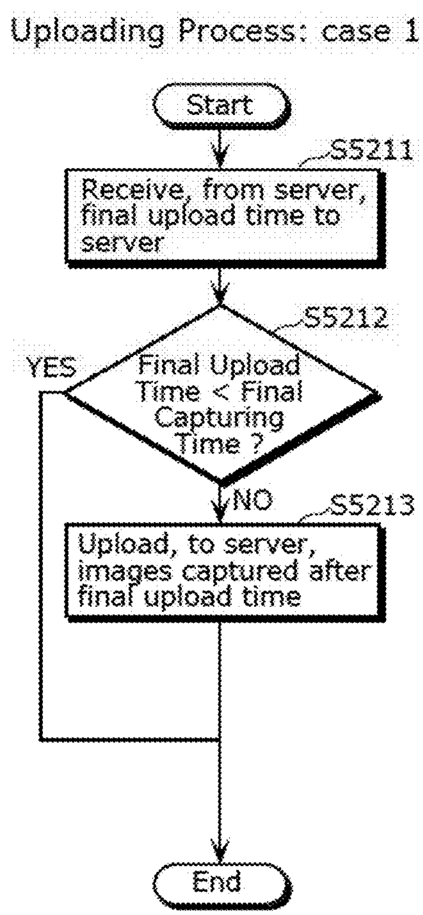
FIG. 42A is a flowchart of uploading steps in the camera according to Embodiment 1 of the present invention.
Figure 42B:
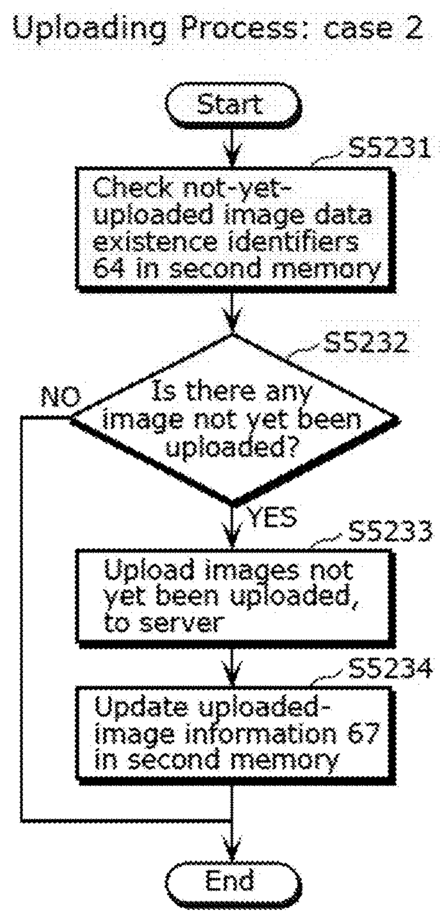
FIG. 42B is a flowchart of uploading steps in the camera according to Embodiment 1 of the present invention.
Figure 42C:
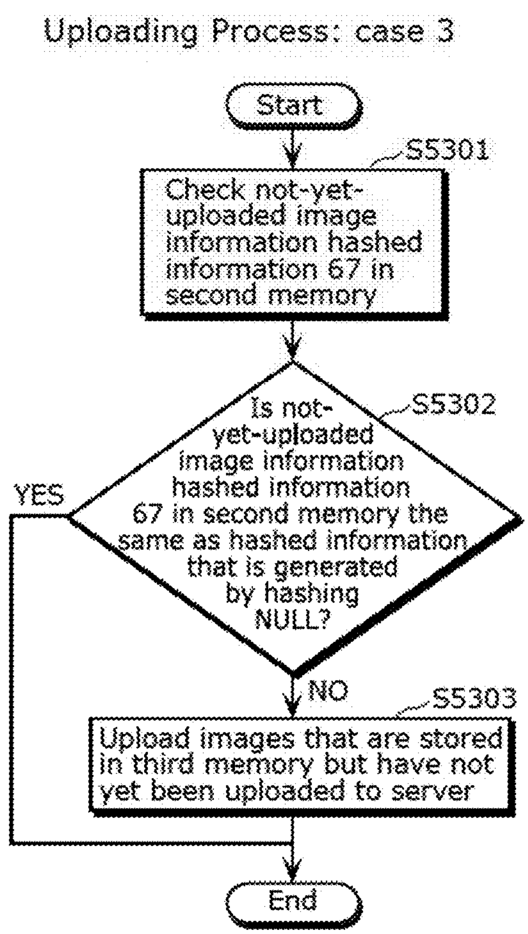
FIG. 42C is a flowchart of uploading steps in the camera according to Embodiment 1 of the present invention.
Figure 42D:
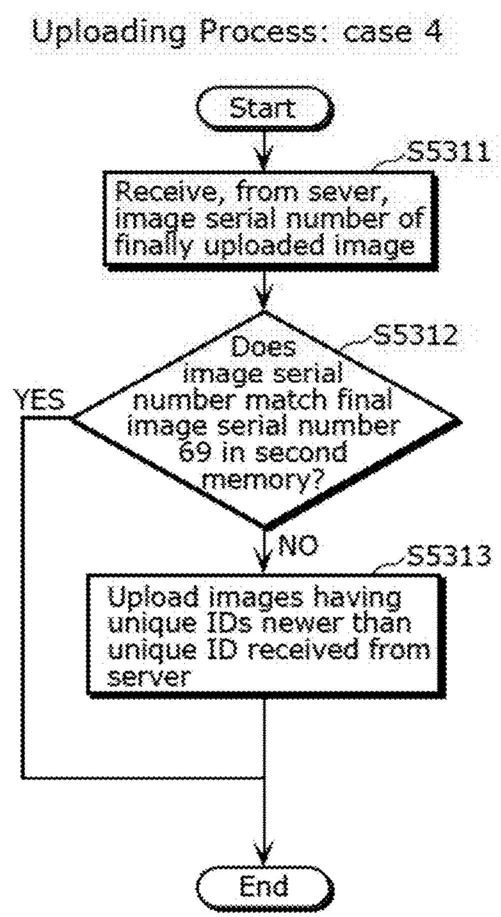
FIG. 42D is a flowchart of uploading steps in the camera according to Embodiment 1 of the present invention.

The cases 1 to 4 in FIGS. 42A, 42B, 42C, and 42C correspond to the above-described cases 1 to 4 of the second memory updating process in FIGS. 40A, 40B, and 40C, respectively.

In case 1, the camera receives, from the server 42, a final upload time (final upload date/time) that is a time of finally uploading to the server 42 (Step S5211). Then, the camera compares the final upload time to the final capturing time (Step S5212). If the final capturing time is later than the final upload time (in other words, if there is any image captured after final uploading), then the camera uploads, to the server 42, any images captured after the final upload time (Step S5213).

In case 2, the camera checks not-yet-uploaded image data existence identifiers 64 in the second memory (Step S5231). Thereby, the camera determines whether or not there is any image not yet been uploaded (Step S5232). If there is any image not yet been uploaded, then the camera uploads images not yet been uploaded, to the server 42 (Step S5233). Then, the camera updates the uploaded-image information 61 in the second memory (Step S5234).

In case 3, the camera checks the not-yet-uploaded image information hashed information 67 in the second memory (Step S5301). Thereby, the camera determines whether or not the not-yet-uploaded image information hashed information 67 in the second memory is the same as hashed information that is generated by hashing NULL (Step S5302). If the not-yet-uploaded image information hashed information 67 is not the same as the hashed information regarding NULL, then the camera determines that there is an image not yet been uploaded to the server 42 and therefore uploads, to the server 42, any images that are stored in the third memory but have not yet been uploaded to the server 42 (Step S5303).

In case 4, the camera receives, from the server 42, an image serial number of a finally uploaded image (Step S5311). Then, the camera determines whether or not the image serial number matches the final image serial number 69 in the second memory (Step S5312). If the image serial number does not match the final image serial number 69, then the camera uploads any images having UIDs that are newer than UID of the final image serial number 69 that is received from the server 42 (Step S5313).

Figure 43:
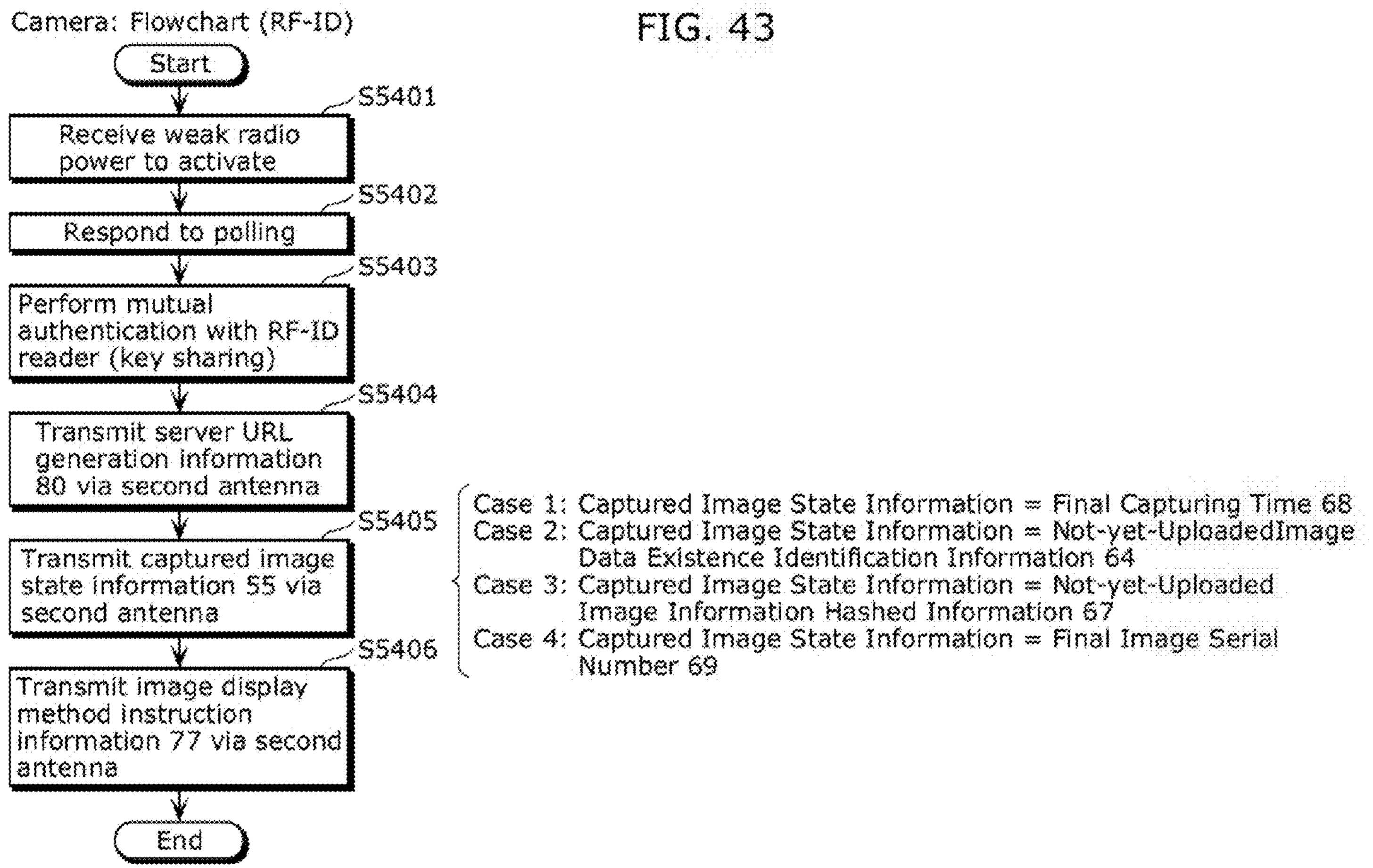
FIG. 43 is a flowchart of operation steps of a RF-ID unit in the camera according to Embodiment 2 of the present invention.

FIG. 43 is a flowchart of RF-ID proximity communication between the image capturing device 1 and the TV 45.

First, the second antenna 21 embedded in the image capturing device 1 receives weak radio power from polling of the RF-ID reader/writer 46 of the TV 45, and thereby activates the RF-ID unit 47 operated under the second power supply unit 91 (S5401).

The RF-ID unit 47 of the image capturing device 1, which is activated by receiving weak power in Step S5401, responds to the polling of the RF-ID reader/writer 46 of the TV 45 (Step S5402).

After responding to the polling in Step S5402, mutual authentication is performed to determine whether or not the RF-ID unit 47 of the image capturing device 1 and the RF-ID reader/writer 46 of the TV 45 are legitimate devices, and also to share a cryptography key used for secure information communication between the image capturing device 1 and the TV 45 (Step S5403). The mutual authentication employs a public key cryptography algorism such as elliptic curve cryptography. In general, the employed method for the mutual authentication is the same as that of mutual authentication used in communication via High Definition Multimedia Interface (HDMI) or IEEE1394.

As described earlier, in Step S5403, the mutual authentication is performed between the RF-ID unit 47 of the image capturing device 1 and the RF-ID reader/writer 46 of the TV 45 to generate a common cryptography key. After that, the server URL generation information 80 is read from the server specific information 48 stored in the second memory 52 readable from the RF-ID unit 47. The server URL generation information 80 is transmitted to the RF-ID reader/writer 46 of the TV 45 via the second antenna 21 (Step S5404). The server URL generation information 80 includes: the server address information 81 indicating address information of the server 42; the user identification information 82 that is the login ID 83 to the server 42; and the password 84 that is a login password to the server 42. The password 84 is important information for preventing unauthorized acts of a malicious third person. Therefore, the password 84 is sometimes encrypted beforehand as the encrypted password 85 to be stored, and then transmitted to the TV 45.

After the server URL generation information 80 is transmitted to the RF-ID reader/writer 46 of the TV 45 in Step S5404, the captured image state information 55 stored in the second memory 52 is also transmitted to the RF-ID reader/writer 46 of the TV 45 via the second antenna 21 (Step S5405). The captured image state information 55 is: the final capturing time 68 (case 1); the existence identifiers 64 which are existence identification information regarding images not yet been uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

In case 1, the final capturing time 68 is used as the captured image state information 55. Therefore, the TV 45 compares the final capturing time 68 to the final upload time. If the final capturing time 68 is temporally later than the final upload time that is a time of finally uploading to the server 42, then it is determined that the image data in the image capturing device 1 is not in synchronization with the image data in the server 42. Therefore, warning information regarding the synchronization failure is displayed on the display unit of the TV 45.

In case 2, the captured image state information 55 is the existence identifiers 64 each of which is assigned to a corresponding one of the captured images so that it is possible to determine whether the image has not yet been uploaded. Therefore, the TV 45 examines the existence identifiers 64 to determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

In case 3, the not-yet-uploaded image information hashed information 67 is employed as the captured image state information 55. Therefore, the TV 45 examines the not-yet-uploaded image information hashed information 67 to determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

In case 4, the captured image state information 55 is the final image serial number 69 from among image serial numbers chronologically assigned to the captured images. Therefore, the TV 45 compares (a) the final image serial number 69 from among image serial numbers chronologically assigned to the captured images to (b) an image serial number of an image finally uploaded to the server 42. Here, the final image serial number 69 is provided from the image capturing device 1, while the image serial number is provided from the server 42. Based on the comparison, the TV 45 can determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

After transmitting the captured image state information 55 from the second antenna 21 of the image capturing device 1 to the RF-ID reader/writer 46 of the TV 45 in Step S5405, the image display method instruction information 77 is also transmitted from the second memory 52 of the image capturing device 1 to the RF-ID reader/writer 46 of the TV 45 via the second antenna 21 (Step S5406). The image display method instruction information 77 is identification information indicating how the display unit of the TV 45 is to display the images downloaded from the server 42. The image display method instruction information 77 includes the list display (indicator) 78 indicating that the images are to be displayed in a list, and the slide show (indicator) 79 indicating that the images are to be displayed as a slide show.

As described above, in Steps S5401 to S5406, the image capturing device 1 transmits the server URL generation information 80, the captured image state information 55, and the image display method instruction information 77, which are stored in the second memory 52 of the image capturing device 1, from the second antenna 21 of the image capturing device 1 to the RF-ID reader/writer 46 of the TV 45. Here, it is desirable to encrypt all of the above pieces of information to be transmitted, by using the cryptography key information shared between the image capturing device 1 and the TV 45 at the mutual authentication. The encryption achieves secure information communication between the image capturing device 1 and the TV 45. As a result, intervention of a malicious third person can be prevented.

Since the server URL generation information 80 is transmitted to the TV 45, the server 42 (and directory) to which the first antenna 20 of the image capturing device 1 transmits data is the same as the server (and directory) from which the TV 45 downloads the data. Therefore, the TV 45 can display the images that have been captured by the image capturing device 1 and then uploaded to the server 42.

In addition, the transmission of the captured image state information 55 to the TV 45 makes it possible to examine synchronization between the captured images stored in the third memory 33 of the image capturing device 1 and the images uploaded from the first antenna 20 to the server 42. Therefore, the TV 45 can detect a failure of the synchronization. The display of the warning information indicating the synchronization failure on the TV 45 can prevent unnecessary confusion of the user.

Moreover, the transmission of the image display method instruction information 77 to the TV 45 enables the user to view images by a set image viewing method without designating the image viewing method on the TV 45. The user merely needs to move the image capturing device 1 into proximity of the TV 45. The complicated operations using a remote controller or the like of the TV 45 are not necessary. The images can be automatically displayed by the set viewing method.

Figure 44:
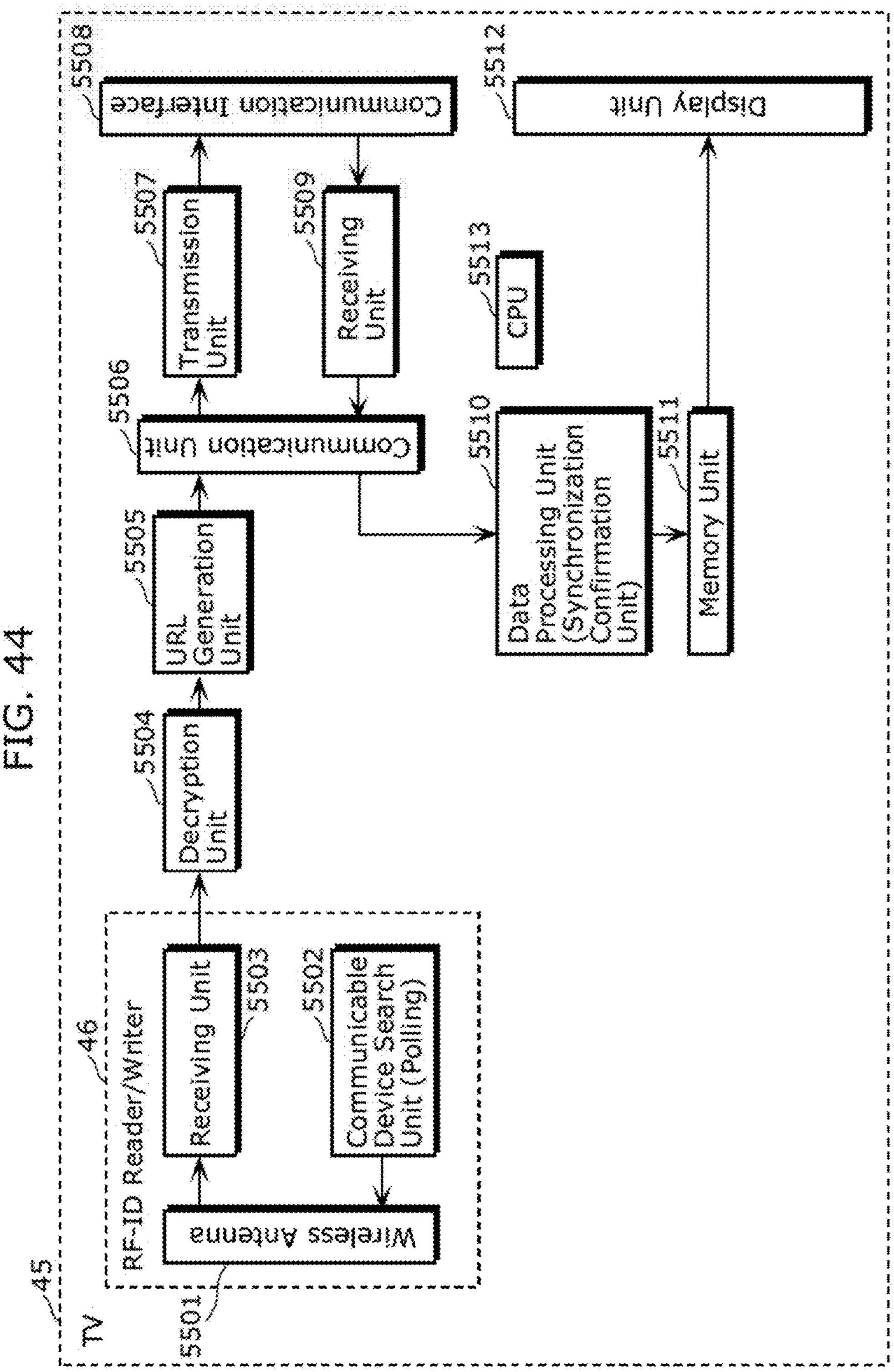
FIG. 44 is a block diagram of a TV according to Embodiment 2 of the present invention.

FIG. 44 is a block diagram of characteristic functions of a TV system according to Embodiment 2 of the present invention.

The TV 45 according to Embodiment 2 includes the RF-ID reader/writer 46, the decryption unit 5504, a URL generation unit 5505, a communication unit 5506, a transmission unit 5507, a communication interface 5508, a receiving unit 5509, a data processing unit 5510, a memory unit 5511, a display unit 5512, and a CPU 5513.

The RF-ID reader/writer 46 communicates with the RF-ID unit 47 of the image capturing device 1 via the second antenna 21. The RF-ID reader/writer 46 includes a wireless antenna 5501, a receiving unit 5503, and a communicable device search unit (polling unit) 5502.

The wireless antenna 5501 performs proximity wireless communication with the second antenna 21 of the image capturing device 1. The wireless antenna 5501 has the same structure as that of wireless antennas of general-purpose RF-ID reader/writers.

The communicable device search unit (polling unit) 5502 performs polling to check a RF-ID unit of each of plural cameras in order to examine whether to have any transmission request (or processing request). If the communicable device search unit 5502 receives a response of the polling from the RF-ID unit 47 of the image capturing device 1 (the corresponding camera), then the mutual authentication is performed to share a common cryptography key between the TV 45 and the image capturing device 1.

When the mutual authentication is completed after receiving the polling response, the receiving unit 5503 receives the server URL generation information 80, the captured image state information 55, and the image display method instruction information 77 from the second memory 52 via the second antenna 21 of the image capturing device 1.

The decryption unit 5504 decrypts the server URL generation information 80, the captured image state information 55, and the image display method instruction information 77 which are received by the receiving unit 5503. The decryption of the server URL generation information 80, the captured image state information 55, and the image display method instruction information 77 which have been encrypted is performed using the cryptography key shared between the image capturing device 1 and the TV 45 after the mutual authentication by the communicable device search unit (polling unit) 5502.

The URL generation unit 5505 generates, based on the server URL generation information 80, a URL to access the server 42, and then transmits the generated URL to the communication unit. The URL includes not only the server specific information, but also the login ID 83 and the password 85 used to login to the server.

The communication unit 5506 communicates with the server 42 via a general-purpose network using the communication interface 5508.

The transmission unit 5507 transmits the URL generated by the URL generation unit 5505 via the communication interface 5508 in order to connect the TV 45 to the server 42.

The communication interface 5508 is a communication interface for connecting the TV 45 to the server 42 via a general-purpose network. The communication interface 5508 is, for example, a wired/wireless LAN interface.

The receiving unit 5509 receives (downloads) image data and an image display cascading style sheet (CSS) from the serer 42 connected by the communication interface 5508.

The data processing unit 5510 performs data processing for the image data downloaded by the receiving unit 5509. If the image data to be downloaded is compressed data, the data processing unit 5510 de-compresses the image data. If the image data is encrypted, the data processing unit 5510 decrypts the image data. In addition, the data processing unit 5510 can arrange the downloaded image data by an image display style based on the image display CSS. If it is determined, based on the captured image state information 55 obtained, if necessary, by decryption of the decryption unit, that the image data in the image capturing device 1 is not in synchronization with the image data in the server 42, then the data processing unit 5510 causes the display unit 5512 to display warning information regarding the synchronization failure. Thereby, unnecessary confusion of the user can be prevented. Moreover, the data processing unit 5510 sets a mode of displaying the downloaded image data, according to the image display method instruction information 77 provided from the decryption unit 5504. For example, if the list display (flag) 78 in the image display method instruction information 77 is ON, then the data processing unit 5510 generates a list of the downloaded images and provides the list to the memory unit 5511. If the slide show (flag) 79 in the image display method instruction information 77 is ON, then the data processing unit 5510 generates a slide show of the downloaded images and provides the slide show to the memory unit 5511.

The memory unit 5511 is a memory that temporarily holds the image data processed by the data processing unit 5510.

The display unit 5512 displays the image data stored in the memory unit 5511. The image data has been downloaded from the server 42 and applied with data processing by the data processing unit 5510 as described earlier.

As descried above, based on the server URL generation information 80, the captured image state information 55, and the image display method instruction information 77 which are received from the RF-ID unit 47 of the image capturing device 1, the TV 45 according to Embodiment 2 of the present invention can be connected to the server 42, then download the uploaded image data from the server 42, and display the downloaded image data on the display unit 5512. Thereby, the user does not need to do complicated processes of removing the third memory 33 such as a Secure Digital (SD) card or a flash memory from the image capturing device 1 and equipping the third memory 33 to a card reader of the TV 45 in order to view captured images. In Embodiment 2 of the present invention, the user can display and view captured image data, by simple operations of simply presenting the RF-ID unit 47 of the image capturing device 1 to the RF-ID reader/writer 46 of the TV 45 for proximity communication.

Embodiment 2 of the present invention can provide a captured image viewing system by which even users who are not familiar with operations of digital devices can easily view image data.

Figure 45:
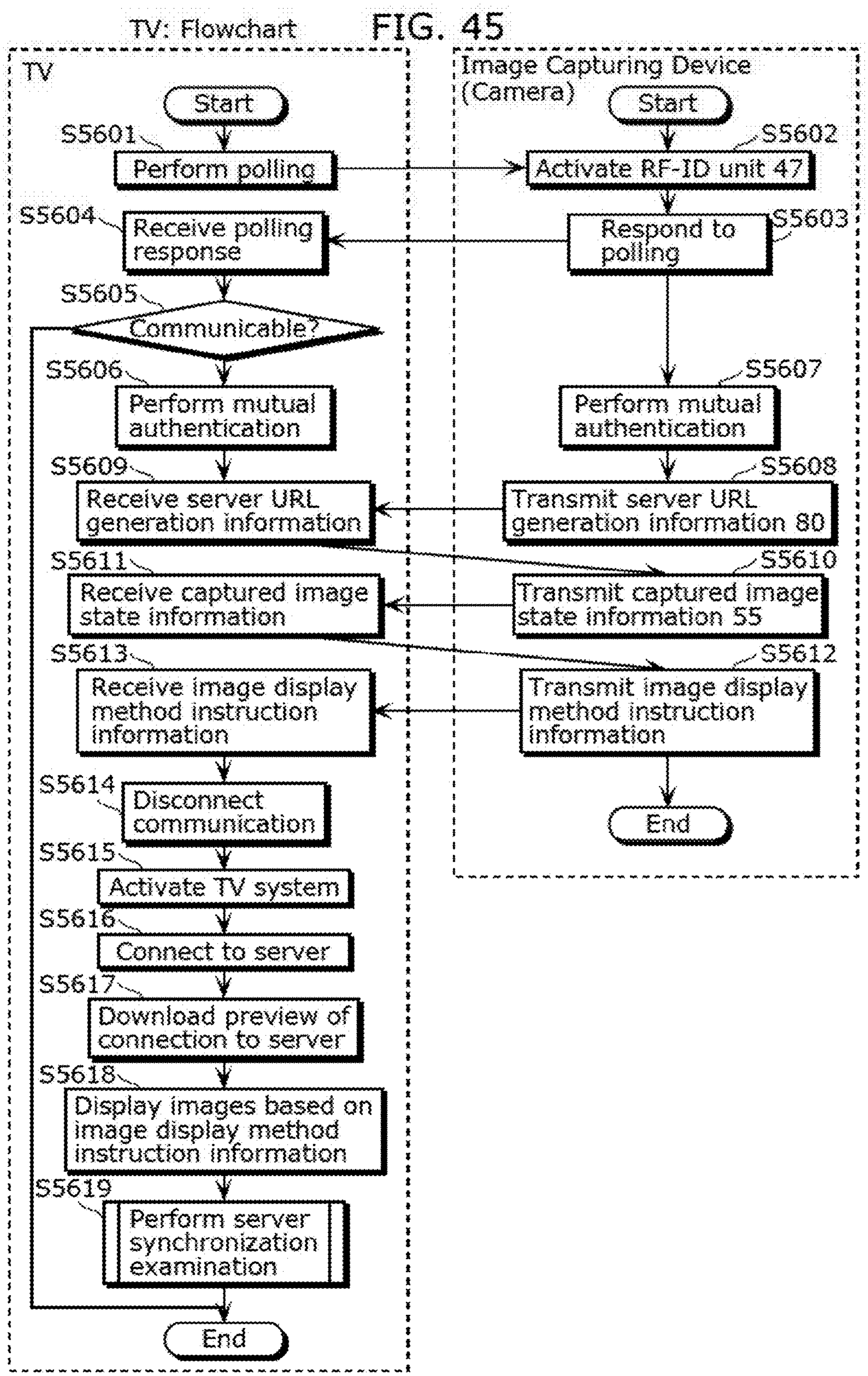
FIG. 45 is a flowchart of RF-ID communication between the camera and the TV, according to Embodiment 2 of the present invention.

FIG. 45 is a flowchart of RF-ID wireless proximity communication between the image capturing device 1 and the TV 45.

First, the communicable device search unit 5502 in the RF-ID reader/writer 46 of the TV 45 transmits a polling signal to search for the RF-ID unit 47 of the communicable image capturing device 1 (Step S5601).

When the image capturing device 1 receives the polling signal from the communicable device search unit 5502 in the RF-ID reader/writer 46 of the TV 45, the second power supply unit 91 is supplied with power to activate (operate) the RF-ID unit 47 (Step S5602). Here, at least the RF-ID unit 47, which can be operated under the second power supply unit 91, is activated. It is not necessary to activate all functions in the image capturing device 1.

When the activation of the RF-ID unit 47 of the image capturing device 1 is completed in Step S5602, the image capturing device 1 transmits a polling response for the polling to the RF-ID reader/writer 46 of the TV 45 via the second antenna 21 (Step S5603).

After the image capturing device 1 responds to the polling in Step S5603, the TV 45 receives the polling response by the wireless antenna 5501 of the RF-ID reader/writer 46 (Step S5604).

After receiving the polling response in Step S5604, the TV 45 determines whether or not the image capturing device 1 transmitting the polling response is a device mutually communicable with the TV 45 (Step S5605). If the determination is made that the image capturing device 1 cannot mutually communicate with the TV 45, then the processing is completed. On the other hand, if the determination is made that the image capturing device 1 is mutually communicable with the TV 45, then the processing proceeds to Step S5606.

If the determination is made that the image capturing device 1 is mutually communicable with the TV 45 in Step S6505, then the TV 45 performs mutual authentication to determine whether or not the image capturing device 1 and the TV 45 are legitimate devices for communication (Step S5606). The mutual authentication is the same as general mutual authentication using HDMI or IEEE1394. In the mutual authentication, issuing of challenge data and checking of response data are performed plural times between the TV 45 and the image capturing device 1 to eventually generate a common cryptography key. If one of the TV 45 and the image capturing device 1 is not legitimate, the common cryptography key is not generated, thereby disabling future mutual communication.

The image capturing device 1 also performs the same mutual authentication in the RF-ID unit 47. Generation and transmission of challenge data and receiving and checking of response data are performed plural times between the TV 45 and the image capturing device 1 to eventually generate a cryptography key identical to the cryptography key generated by the TV 45 (Step S5607).

When the mutual authentication is completed in Step S5607, the image capturing device 1 reads the server URL generation information 80 as the server specific information 48 from the second memory 52, then encrypts the server URL generation information 80 using the common cryptography key generated at the mutual authentication, and transmits the encrypted server URL generation information 80 to the RF-ID reader/writer 46 of the TV 45 (Step S5608).

The TV 45 receives the encrypted server URL generation information 80 transmitted in Step S5608, by the receiving unit 5503 in the RF-ID reader/writer 46. Then, the decryption unit 5504 decrypts the encrypted server URL generation information 80 using the common cryptography key. Based on the server URL generation information 80, the URL generation unit 5505 generates a URL to access the server 42. Then, the TV 45 transmits, to the image capturing device 1, a notification of completion of receiving the server URL generation information 80 (Step S5609).

After the notification of the receiving completion is transmitted in Step S5609, the image capturing device 1 receives the notification by the second antenna 21. Then, the image capturing device 1 reads the captured image state information 55 from the second memory 52 to transmit the captured image state information to the TV 45 (Step S5610). The captured image state information 55 is: the final capturing time 68 (case 1); the existence identifiers 64 which are existence identification information regarding images not yet been uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

After the image capturing device 1 transmits the captured image state information 55 in Step S5610, the TV 45 receives the captured image state information 55 by the RF-ID reader/writer 46 and then transmits, to the image capturing device 1, a notification of completion of receiving the captured image state information 55 (Step S5611). Here, the CPU 5513 in the TV 45 performs the following processing depending on kinds of the received captured image state information 55.

In case 1, the final capturing time 68 is used as the captured image state information 55. Therefore, the TV 45 compares the final capturing time 68 to the final upload time that is a time of finally uploading to the server 42. If the final capturing time 68 is temporally later than the final upload time, then it is determined that the image data in the image capturing device 1 is not in synchronization with the image data in the server 42. Therefore, warning information regarding the synchronization failure is displayed on the display unit of the TV 45.

In case 2, the captured image state information 55 is the existence identifiers 64 each of which is assigned to a corresponding one of the captured images so that it is possible to determine whether the image has not yet been uploaded. Therefore, the TV 45 examines the existence identifiers 64 to determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

In case 3, the not-yet-uploaded image information hashed information 67 is employed as the captured image state information 55. Therefore, the TV 45 examines the not-yet-uploaded image information hashed information 67 to determine whether or not there is any image not yet been uploaded. If there is any image not yet been uploaded, then it is determined that the image data in the image capturing device 1 is not in synchronization with the image data in the server 42.

Therefore, warning information regarding the synchronization failure is displayed on the display unit of the TV 45.

In case 4, the captured image state information 55 is the final image serial number 69 from among image serial numbers chronologically assigned to the captured images. Therefore, the TV 45 compares (a) the final image serial number 69 from among image serial numbers chronologically assigned to the captured images to (b) an image serial number of an image finally uploaded to the server 42. Here, the final image serial number 69 is provided from the image capturing device 1, while the image serial number is provided from the server 42. Based on the comparison, the TV 45 can determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

After the TV 45 completes receiving of the captured image state information 55 and transmits the notification of the receipt to the image capturing device 1 in Step S5611, the image capturing device 1 reads the image display method instruction information 77 from the second memory 52 and transmits the image display method instruction information 77 to the TV 45 (Step S5612). The image display method instruction information 77 includes the list display (flag) 78 and the slide show (flag) 79.

After the image display method instruction information 77 is transmitted in Step S5612, the TV 45 receives the image display method instruction information 77 by the RF-ID reader/writer 46 of the TV 45 and transmits a notification of completion of receiving the image display method instruction information 77 to the image capturing device 1 (Step S5613). The data processing unit 5510 of the TV 45 generates a mode of displaying images downloaded from the server 42, based on the received image display method instruction information 77. For example, if the list display flag in the image display method instruction information 77 is ON, the data processing unit 5510 generates a list of the downloaded images and stores the generated list in the memory unit 5511 and causes the display unit 5512 to display the list. On the other hand, if the slide show flag in the image display method instruction information 77 is ON, the data processing unit 5510 generates a slide show of the downloaded images and stores the generated slide show in the memory unit 5511 and causes the display unit 5512 to display the slide show.

After receiving the image display method instruction information 77 in Step S5613, the TV 45 disconnects communication from the RF-ID unit 47 of the image capturing device 1 (Step S5614).

Next, the TV 45 activates a TV system (Step S5615). The activation of the TV system refers to turning the main power of the TV 45 ON to display the downloaded image data on the display unit 5512. Prior to the activation of the TV system in Step S5615, at least the RF-ID reader/writer 46 of the TV 45 is activated and the display unit 5512 may be turned OFF.

Then, the communication unit 5506 is activated to connect the TV 45 to the server 42 based on the URL generated by the URL generation unit 5505 (Step S5616).

After connecting to the server 42 in Step S5616, the TV 45 downloads uploaded image data from the server 42 (Step S5617).

The data processing unit 5510 generates to-be-displayed image data from the images downloaded at the Step S5617, based on the image display method instruction information 77 obtained from the camera (the image capturing device 1), then stores the generated image data into the memory unit 5511, and displays the image data on the display unit 5512 (Step S5618). The data processing unit 5510 of the TV 45 generates a mode of displaying the images (image data) downloaded from the server 42, based on the received image display method instruction information 77. For example, if the list display flag 78 in the image display method instruction information 77 is ON, the data processing unit 5510 generates a list of the downloaded images and stores the generated list in the memory unit 5511 and causes the display unit 5512 to display the list. On the other hand, if the slide show flag 79 in the image display method instruction information 77 is ON, the data processing unit 5510 generates a slide show of the downloaded images and stores the generated slide show in the memory unit 5511 and causes the display unit 5512 to display the slide show.

After displaying of the images downloaded from the server 42 is completed in Step S5617, the TV 45 performs synchronization examination to determine whether or not the captured images recorded in the third memory 33 of the image capturing device 1 are in synchronization with the images downloaded from the server 42 (Step S5619). The synchronization examination is performed based on the captured image state information provided in Step S5611 from the image capturing device 1. The captured image state information 55 is: the final capturing time 68 (case 1); the existence identifiers 64 which are existence identification information regarding images not yet been uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

FIGS. 46A and 46B are flowcharts of details of the server synchronization examination (Step S5619) of FIG. 45 when the captured image state information 55 are cases 1 to 4, respectively.

(a) in FIG. 46A is a flowchart of case 1 where the captured image state information 55 is the final capturing time 68.

First, the communication unit 5506 of the 45 receives, from the server 42, date/time of finally uploading to the server 42 (hereinafter, referred to also as a "final upload date/time" that may be date/time of capturing a final image among uploaded images to produce the same advantages) (Step S5701).

Next, the TV 45 compares the final upload date/time to a final capturing date/time 68 (Step S5702). The final capturing date/time 68, which is date/time of final capturing of the image capturing device 1, is indicated in the captured image state information 55 provided from the image capturing device 1 to the RF-ID reader/writer 46. If the final upload date/time is prior to the final capturing date/time 68, it is determined that there is an image captured after the final upload and not yet been uploaded to the server 42. Therefore, a determination is made that the images in the image capturing device 1 are not in synchronization with the images in the server 42. Then, warning information is displayed in Step S5703. On the other hand, if the final upload date/time is equal to the final capturing date/time 68, it is determined that the images in the image capturing device 1 are in synchronization with the images in the server 42. Then, the synchronization examination is completed without displaying warning information.

If it is determined in Step S5702 that the images in the image capturing device 1 are not in synchronization with the images in the server 42, the display unit 5512 displays warning information indicating the synchronization failure. Here, if time information is generated by comparing the final upload date/time to the final capturing date/time 68 in order to indicate from when captured images are not uploaded, and the generated time information is presented as a message together with the warning information, the warning information is convenient for the user.

(b) in FIG. 46A is a flowchart of case 2 where the captured image state information 55 is the existence identifiers 64 each of which is assigned to a corresponding one of the captured images so that it is possible to determine whether the image has not yet been uploaded.

First, it is determined, based on the existence identifiers of the not-yet-uploaded image existence identification information, whether or not there is any image not yet been uploaded to the server 42 from among the captured images stored in the third memory 33 of the image capturing device 1 (Step S5711). Here, the existence identifiers are indicated in the captured image state information 55 provided from the image capturing device 1 to the RF-ID reader/writer 46. If it is determined that there is an image not yet been uploaded to the server 42 in Step S5711, then the processing proceed to Step S5712 to display warning information. On the other hand, if there is not image not yet been uploaded, it is determined that the images in the image capturing device 1 are in synchronization with the images in the server 42. Then, the synchronization examination is completed without displaying warning information.

If it is determined that the images in the image capturing device 1 are not in synchronization with the images in the server 42, the display unit 5512 displays warning information indicating the synchronization failure in Step S5712.

(c) in FIG. 46B is a flowchart of case 3 where the captured image state information 55 is the not-yet-uploaded image information hashed information 67.

First, it is determined, based on the not-yet-uploaded image information hashed information 67, whether or not there is any image not yet been uploaded to the server 42 from among the captured images stored in the third memory 33 of the image capturing device 1 (Step S5721). Here, the not-yet-uploaded image information hashed information 67 is indicated in the captured image state information 55 provided from the image capturing device 1 to the RF-ID reader/writer 46. The determination of Step S5721 is performed by comparing the not-yet-uploaded image information hashed information 67 to a hashed value generated by hashing NULL generated in the TV 45. If it is determined that there is an image not yet been uploaded in Step S5721, then the processing proceed to Step S5722 to display warning information. On the other hand, if there is no image not yet been uploaded, it is determined that the images in the image capturing device 1 are in synchronization with the images in the server 42. Then, the synchronization examination is completed without displaying warning information.

If it is determined that the images in the image capturing device 1 are not in synchronization with the images in the server 42, the display unit 5512 displays warning information indicating the synchronization failure in Step S5722.

(d) in FIG. 46B is a flowchart of case 4 where the captured image state information 55 is a final image serial number from among image serial numbers assigned to captured images.

First, the communication unit 5506 of the TV 45 receives, from the server 42, an image serial number of an image finally uploaded to the server 42 (Step S5731).

Next, the TV 45 compares (a) the image serial number 69 of the image finally uploaded which is provided form the server 42 to (b) a final image serial number 69 of an image finally captured which is indicated in the captured image state information 55 provided from the image capturing device 1 by the RF-ID reader/writer 46 (Step S5732). If the mage serial number 69 of the image finally uploaded is smaller than the mage serial number 69 of the image finally captured, it is determined that there is an image captured after the final upload and not yet been uploaded to the server 42. Therefore, a determination is made that the images in the image capturing device 1 are not in synchronization with the images in the server 42. Then, the processing proceeds to Step S5733 to display warning information. On the other hand, if the mage serial number 69 of the image finally uploaded is identical to the mage serial number 69 of the image finally captured, it is determined that the images in the image capturing device 1 are in synchronization with the images in the server 42. Then, the synchronization examination is completed without displaying warning information.

If it is determined in Step S5732 that the images in the image capturing device 1 are not in synchronization with the images in the server 42, the display unit 5512 displays warning information indicating the synchronization failure.

When all of images captured by the image capturing device 1 are not uploaded to the serve 42 (in other words, when images captured by the image capturing device 1 are not in synchronization with images uploaded to the server 42), any of above cases 1 to 4 makes it possible to detect the synchronization failure. Thereby, although all of the captured images cannot be displayed on the display unit 5512, a convenient message can be displayed to the user to inform the synchronization failure. As a result, unnecessary confusion of the user can be prevented.

Figure 47A:
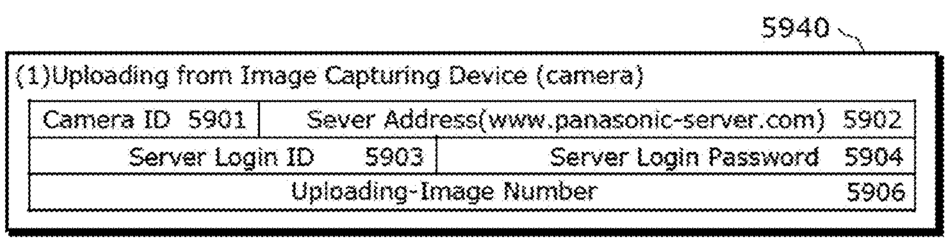
FIG. 47A presents a data format used in uploading captured images from the camera to the server.
Figure 47B:
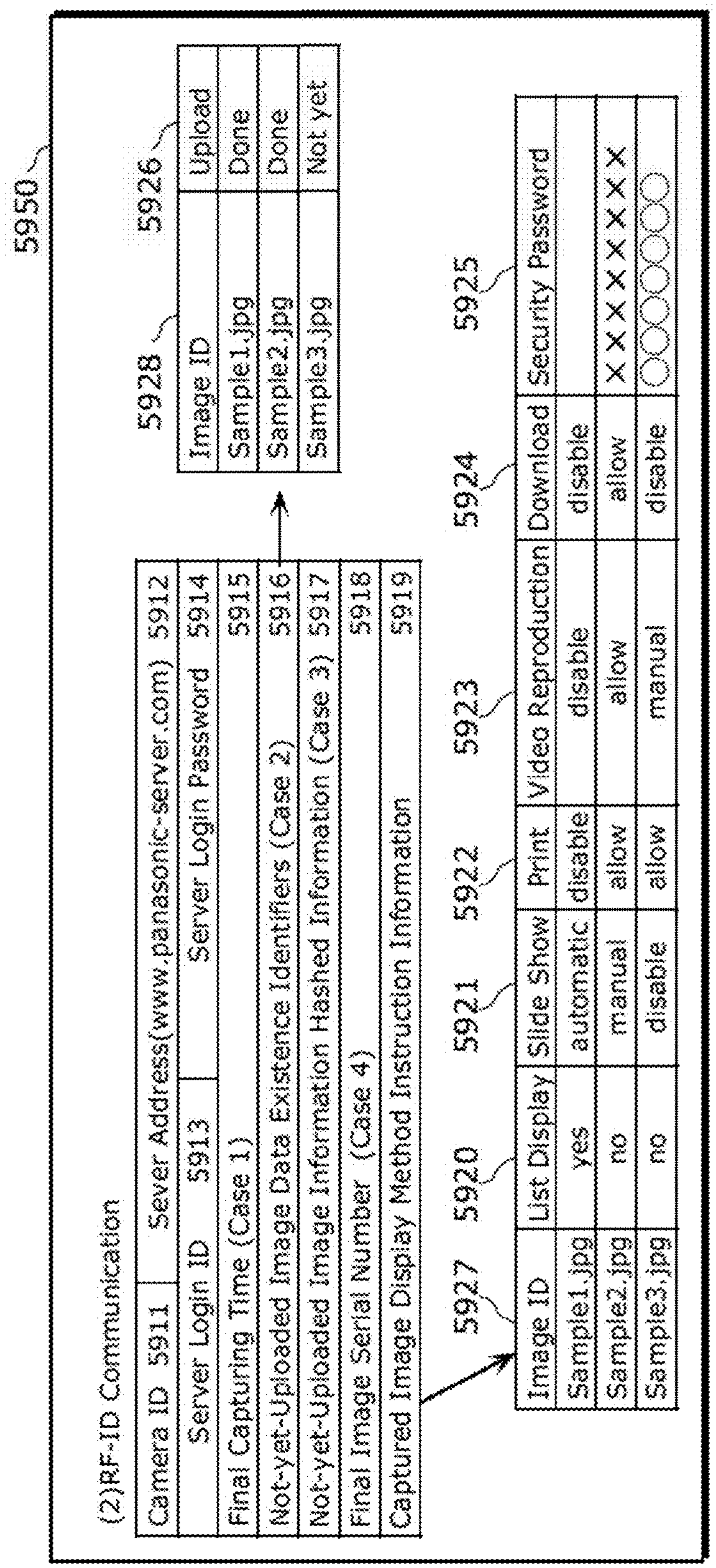
FIG. 47B presents a data format of the RF-ID communication between the camera and the TV.

FIGS. 47A and 47B are diagrams showing (1) a data format used in uploading captured images from the image capturing device to the server 42 and (2) a data format used in RF-ID communication between the image capturing device 1 and the TV 45.

First, (1) a data format 5940 in uploading captured images from the image capturing device 1 to the server 42 is described. The data format 5940 includes camera ID 5901, a sever address 5902, a server login ID 5903, a server login password 5904, an image directory 5905, and an uploading-image number 5906.

The camera ID 5901 is camera UID uniquely assigned to each camera (image capturing device 1). The camera ID 5901 is ID information recorded in the camera ID 76 in the second memory 52 of the image capturing device 1. Use of the camera ID 5901 as login ID to the server 42 can provide a server address unique to each image capturing device 1 so that the image capturing device 1 can access the server 42 without user's entry of login ID. In addition, the camera ID 5901 enables the server 42 to manage captured images for each capturing camera.

The sever address 5902 is included in the server address information 81 in the server specific information 48 stored in the second memory 52 of the image capturing device 1. The sever address 5902 enables the TV 45 to identify the server to which target image data is uploaded.

The server login ID 5903 is included in the login ID 83 in the user identification information 82 in the server specific information 48 stored in the second memory 52 of the image capturing device 1. The server login ID 5903 allows the TV 45 to login, by using the same account, to the server to which the image capturing device 1 uploads image data.

The server login password 5904 is included in the password 84 in the server specific information 48 stored in the second memory 52 of the image capturing device 1. The server login password 5904 allows the TV 45 to login, by using the same account, to the server to which the image capturing device 1 uploads image data.

The uploading-image number 5906 is the number of images to be uploaded to the server. The uploading-image number 5906 is equal to the number of images which is stored as the not-yet-uploaded-image number 65 in the second memory 52 of the image capturing device 1. After capturing images, the number of images not yet been uploaded is indicated in the uploading-image number 5906.

After transmitting the data format 5940, the image capturing device 1 uploads, to the server 42, the images that are stored in the third memory 33 of the image capturing device 1 but not yet been uploaded to the server 42.

Next, (2) a data format 5950 used in RF-ID communication between the image capturing device 1 and the TV 45 is described. The data format 5950 includes camera ID 5911, a sever address 5912, a server login ID 5913, a server login password 5914, a final capturing date/time (final capturing time) 5915, and not-yet-uploaded image data existence identifiers 5916, not-yet-uploaded image information hashed information 5917, a final image serial number 5918, and image display method instruction information 5919.

The camera ID 5911 is a camera UID uniquely assigned to each camera (image capturing device 1). The camera ID 5911 is ID information recorded in the camera ID 76 in the second memory 52 of the image capturing device 1. Use of the camera ID 5911 as login ID to the server 42 from the TV 45 can provide a server address unique to each image capturing device 1 so that the TV 45 can access the server 42 without user's entry of login ID. The camera ID 5901 may be used in the mutual authentication between the RF-ID unit 47 of the image capturing device 1 and the RF-ID reader/writer 46 of the TV 45.

The sever address 5912 is included in the server address information 81 in the server specific information 48 stored in the second memory 52 of the image capturing device 1. The sever address 5912 enables the TV 45 to identify the server to which target image data is uploaded.

The server login ID 5913 is included in the login ID 83 in the user identification information 82 in the server specific information 48 stored in the second memory 52 of the image capturing device 1. The server login ID 5913 allows the TV 45 to login, by using the same account, to the server to which the image capturing device 1 uploads image data.

The server login password 5914 is included in the password 84 in the server specific information 48 stored in the second memory 52 of the image capturing device 1. The server login password 5914 allows the TV 45 to login, by using the same account, to the server to which the image capturing device 1 uploads image data.

The final capturing date/time 5915 corresponds to the final capturing time 68 in the captured image state information 55 stored in the second memory 52 of the image capturing device 1. The TV 45 uses the final capturing date/time 5915 for the synchronization examination between captured images in the image capturing device 1 and captured images in the server 42.

The not-yet-uploaded image data existence identifiers 5916 correspond to the not-yet-uploaded image data existence identification information in the captured image state information 55 stored in the second memory 52 of the image capturing device 1. TV 45 uses the not-yet-uploaded image data existence identifiers 5916 for the synchronization examination between captured images in the image capturing device 1 and captured images in the server 42. In order to implement each of the not-yet-uploaded image data existence identifiers 5916, each image ID 5928 for identifying a corresponding one of captured images is assigned with an upload flag 5926 indicating whether or not the corresponding image has been uploaded to the server 42. Thereby, it is possible to determine whether or not each of the captured images has been uploaded to the server 42.

The not-yet-uploaded image information hashed information 5917 corresponds to the not-yet-uploaded image information hashed information 67 in the captured image state information 55 stored in the second memory 52 of the image capturing device 1. The TV 45 uses the not-yet-uploaded image information hashed information 5917 for the synchronization examination between captured images in the image capturing device 1 and captured images in the server 42.

The final image serial number 5918 corresponds to the final image serial number 69 in the captured image state information 55 stored in the second memory 52 of the image capturing device 1. The TV 45 uses the final image serial number 5918 for the synchronization examination between captured images in the image capturing device 1 and captured images in the server 42.

The image display method instruction information 5919 corresponds to the image display method instruction information 77 in the captured image state information 55 stored in the second memory 52 of the image capturing device 1. The image display method instruction information 5919 includes identification information by which the TV 45 designates a method of viewing images downloaded from the server 42.

For each image ID 5927, the image display method instruction information 5919 includes a list display flag 5920, a slide show flag 5921, a print flag 5922, a video reproduction flag 5923, a download flag 5924, and a security password 5925.

The image ID 5927 is information unique to a captured image. The pieces of image ID 5927 are chronologically assigned to captured images by the image capturing device 1 in capturing the images.

The list display flag 5920 corresponds to the list display (flag) 78 stored in the second memory 52 of the image capturing device 1. The TV 45 uses the list display flag 5920 to determine whether or not image data downloaded from the server 42 is to be displayed in a list format. If the list display flag 5920 indicates "yes", the data processing unit 5510 of the TV 45 generates a list of the downloaded images, stores the list to the memory unit 5511, and then displays the list on the display unit 5512.

The slide show flag 5921 corresponds to the slide show (flag) 79 stored in the second memory 52 of the image capturing device 1. The TV 45 uses the slide show flag 5921 to determine whether or not image data downloaded from the server 42 is to be displayed as a slide show. If the slide show flag 5921 indicates "automatic", the data processing unit 5510 of the TV 45 generates a slide show of the downloaded images, stores the slide show to the memory unit 5511, and then displays the slide show on the display unit 5512. If the slide show flag 5921 indicates "manual", the TV 45 permits execution of the slide show according to instructions from the user. If the slide show flag 5921 indicates "disable", the TV 45 inhibits display of the slide show.

The print flag 5922 indicates whether or not images to be downloaded to the TV 45 and then displayed on the display unit 5512 are permitted to be printed by a printer (not shown) connected to the TV 45. The print flag 5922 is not shown in the image display method instruction information 77 stored in the second memory 52 of the image capturing device 1. However, if the print flag 5922 is added, it is possible to set whether or not image data is printable. As a result, usability related to use of images can be improved.

The video reproduction flag 5923 indicates whether or not video data captured by the image capturing device 1 and then uploaded to the server 42 is permitted to be downloaded by the TV 45 and then viewed. If the image capturing device 1 has a video capturing function, addition of the video reproduction flag 5923 to the image display method instruction information 77 stored in the second memory 52 can add setting of whether or not video reproduction is permitted. As a result, the video reproduction can be managed without complicated operations by the user.

The download flag 5924 is an identifier indicating whether or not image or video uploaded to the server 42 is permitted to be downloaded (copied) to a memory in the TV 45. The download flag 5924 can prevent that the image or video is copied by the third person to which image capturing is not permitted. Thereby, copy-right protection is also achieved.

The security password 5925 is password information that permits only the authorized user to perform the above-described image viewing, printing, and downloading processes. In Embodiment 2, the same password is set for each of the above-described image viewing, printing, and downloading processes. It is preferable, however, to set a different password to each of image viewing, printing, and downloading processes, so that a level of security can be set independently.

As described above, in the system according to Embodiment 2 of the present invention, the image capturing device 1 uploads captured images to the server connected to the image capturing device 1 via the first antenna. When the image capturing device 1 is prevented to the RF-ID reader/writer 46 of the TV 45, the image capturing device 1 transmits the server URL generation information 80, the captured image state information 55, and the image display method instruction information 77 from the RF-ID unit 47 to the TV 45 by the RF-ID communication. Then, the TV 45 connects to the server to which the image capturing device 1 has uploaded the captured images, then downloads the captured images from the server, and displays the captured images. Here, it is determined whether or not the captured images in the server 42 are in synchronization with the captured images in the image capturing device 1. If the synchronization is failure, the TV 45 displays notification of the synchronization failure on the display unit 5512. Thereby, the user can display the captured images only by presenting the image capturing device 1 to the TV 45, although the user conventionally has to remove a recording memory from the camera (the image capturing device 1) to be equipped to the TV 45 in order to view the images. Thereby, even the user who is not familiar with operations of digital devices can easily display the images on the TV 45.

[Embodiment 3]

Embodiment 3 according to the present invention is described below.

Figure 48:
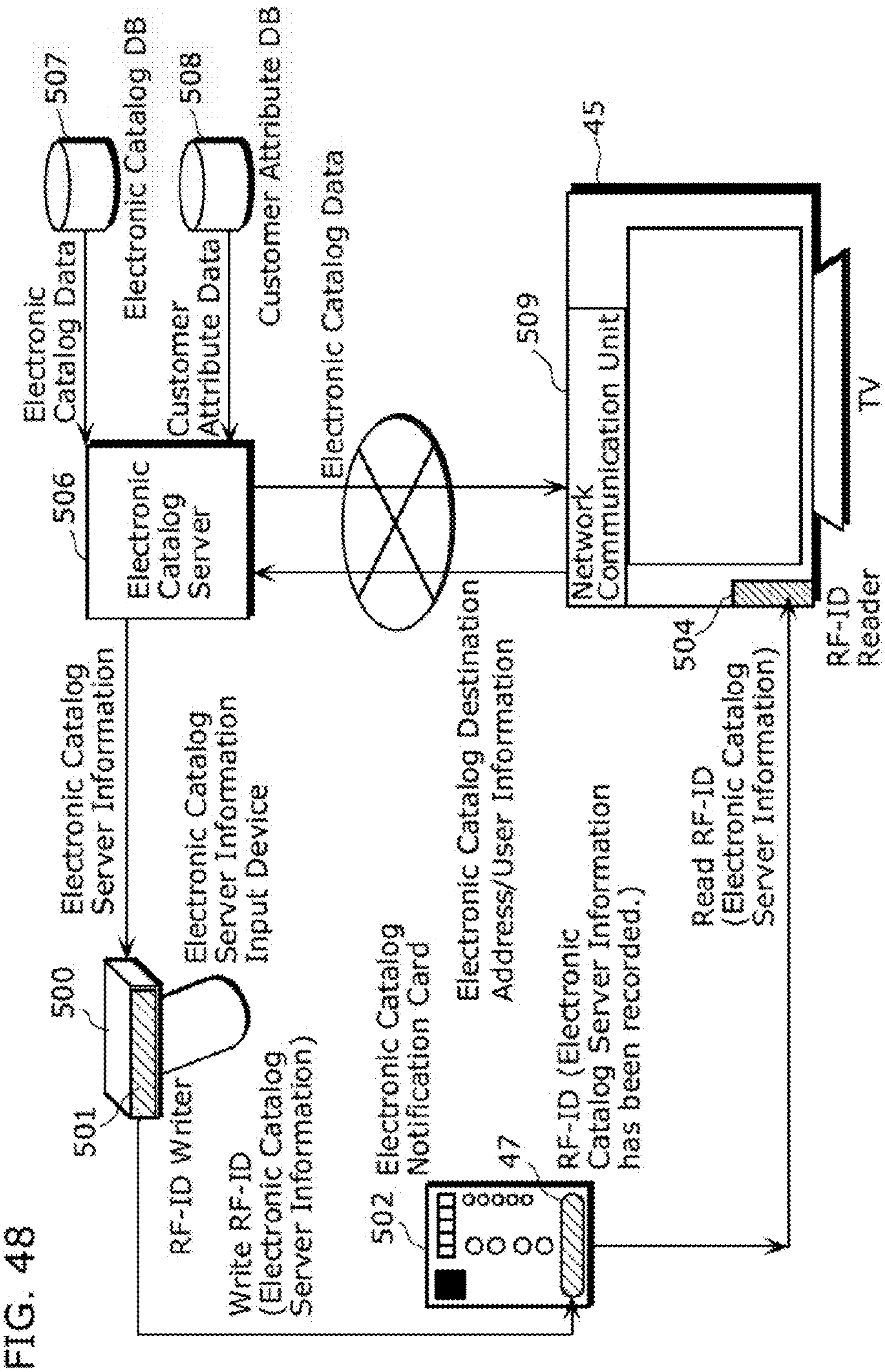
FIG. 48 is a schematic diagram of an electronic catalog display system.

First, Embodiment 3 is explained in summary. FIG. 48 is a schematic block diagram of an electronic catalog display system according to Embodiment 3. The electronic catalog display system according to Embodiment 3 includes an electronic catalog server information input device 500, an electronic catalog notification card 502, the TV 45, and an electronic catalog server 506. The electronic catalog server information input device 500 includes a RF-ID writer 501. The electronic catalog notification card 502 includes a RF-ID unit 47. The TV 45 includes a RF-ID reader 504 and a network communication unit 509. The electronic catalog server 506 includes an electronic catalog database 507 and a customer attribute database 508.

The electronic catalog server information input device 500 writes electronic catalog server information from the RF-ID writer 501 to the RF-ID unit 47 attached to the electronic catalog notification card 502. The electronic catalog server information is provided from a user who provides services of an electronic catalog (hereinafter, referred to as a "provider user"). When a user who receives the services of the electronic catalog (hereinafter, referred to as a "customer user") brings the electronic catalog notification card 502, in which the electronic catalog server information is written, into proximity of the TV 45, the RF-ID reader 504 in the TV 45 reads the electronic catalog server information from the RF-ID unit 47. In addition, the TV 45 transmits, based on the readout electronic catalog server information, a request for obtaining an electronic catalog to the electronic catalog server 506 set on a network via the network communication unit 509. Furthermore, when transmitting the request to the electronic catalog server, the TV 45 transmits also user information, which is previously inputted in the TV 45, to the electronic catalog server 506. The electronic catalog server 506 receives the request for the electronic catalog and the user information from the TV 45. First, the electronic catalog server 506 obtains customer attribute data from the customer attribute database 508 based on the user information. Next, from the electronic catalog database 507, the electronic catalog server 506 obtains electronic catalog data associated with the customer attribute data. Then, the electronic catalog server 506 transmits the obtained electronic catalog data to the TV 45 from which the request for the electronic catalog has been transmitted. The TV 45 displays the electronic catalog data received from the electronic catalog server 506, and thereby receives purchase operations from the customer user to purchase products in the electronic catalog data.

The following describes the electronic catalog display system according to Embodiment 3 in more detail.

Figure 49:
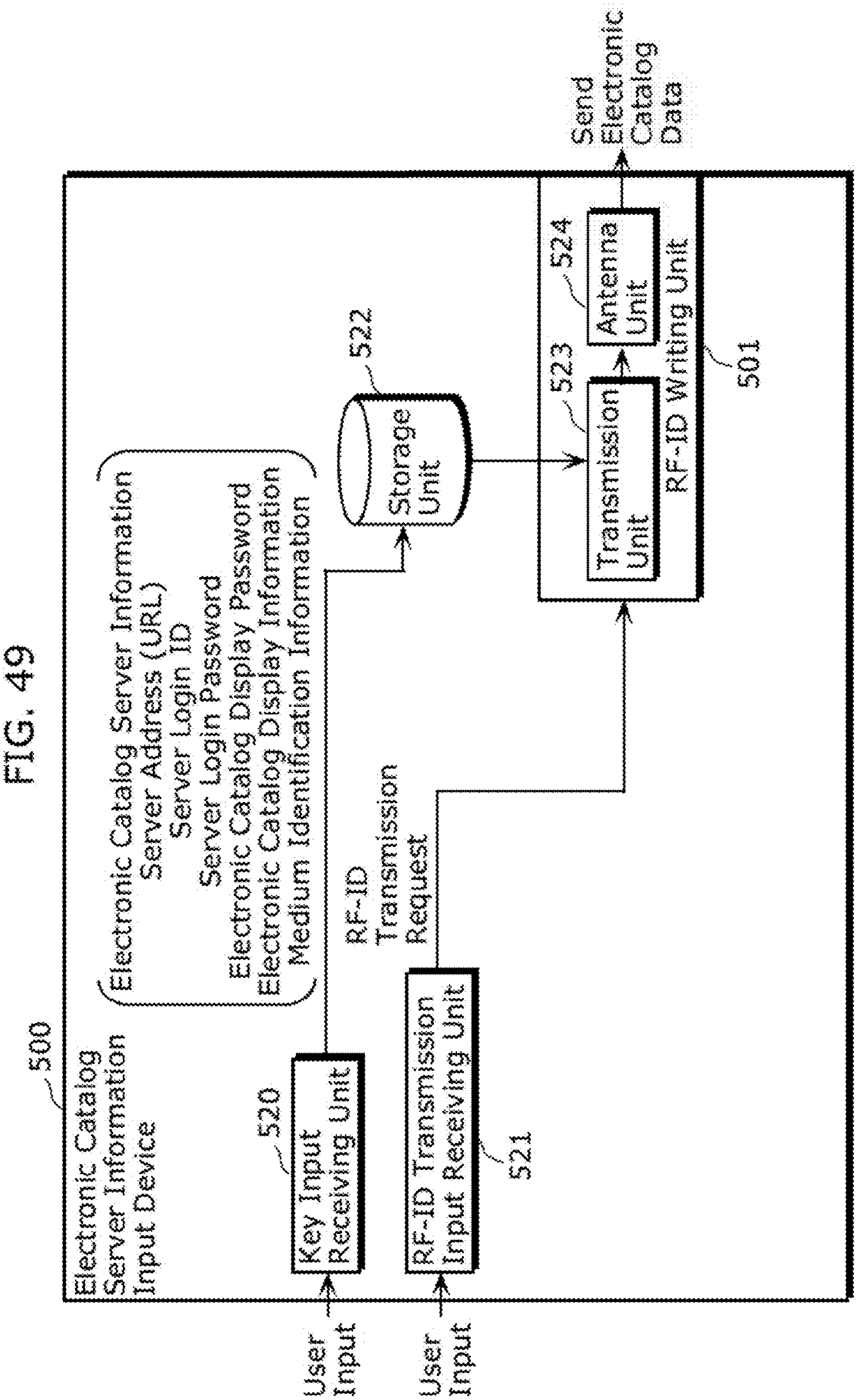
FIG. 49 is a block diagram of an electronic catalog server information input device.
Figure 50:
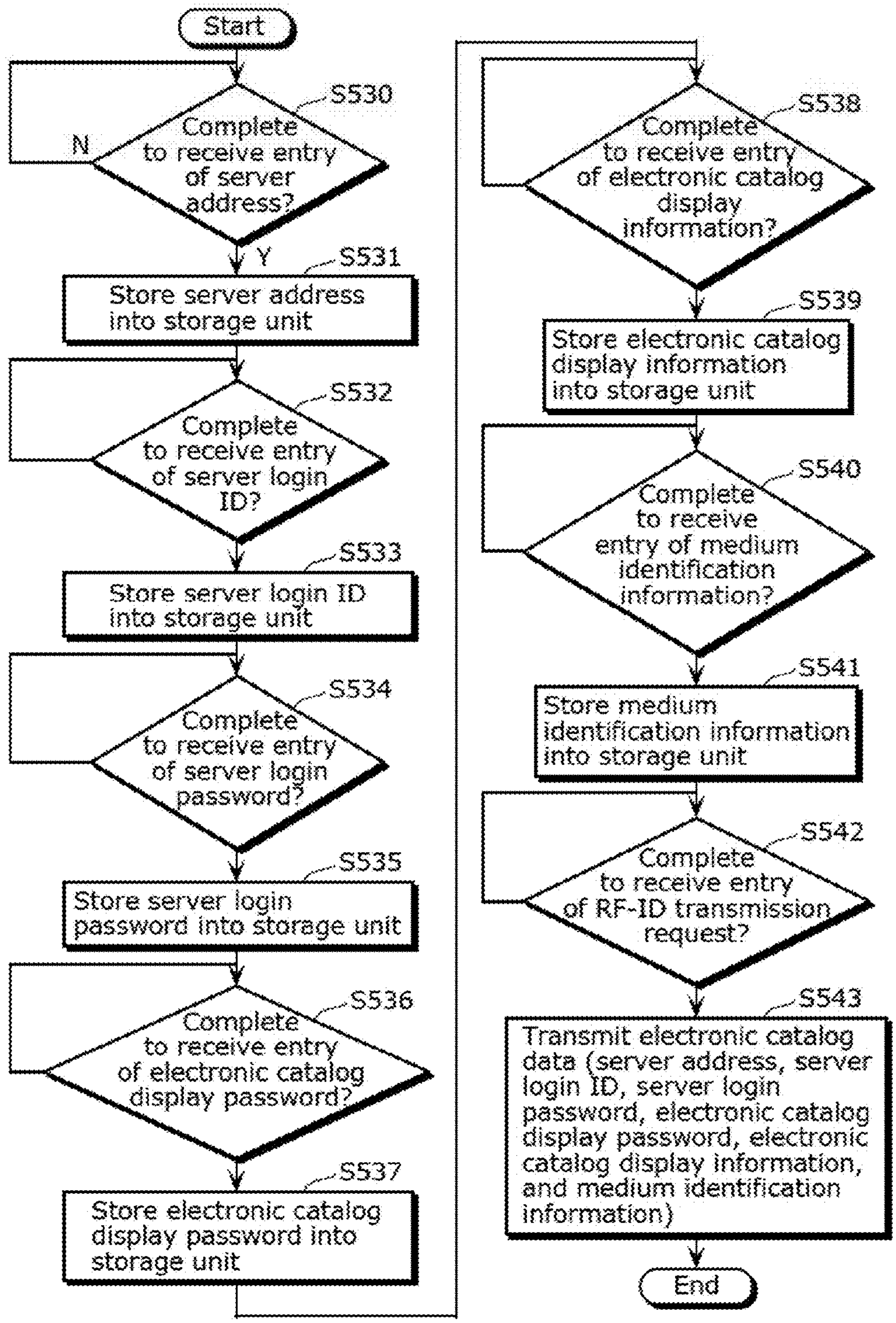
FIG. 50 is a flowchart of steps of processing performed by the electronic catalog server information input device.

FIG. 49 is a functional block diagram illustrating a structure of the electronic catalog server information input device according to Embodiment 3. First, a key input receiving unit 520 receives an input by input keys operated by the provider user, in order to obtain the electronic catalog server information. The electronic catalog server information obtained by the key input receiving unit 520 includes: a sever address such as a URL; server login ID; a server login password; an electronic catalog display password; electronic catalog display information; and a medium identification information. The electronic catalog display information indicates whether images of products/services in the electronic catalog are to be displayed in a list (as thumbnails) or sequentially (as a slide show). The medium identification information is used for identifying a medium such as a card or a postcard to which RF-ID is attached. The electronic catalog server information obtained by the key input receiving unit 520 is stored into a storage unit 522. Next, when a RF-ID transmission key and the like are received after receiving of the electronic catalog server information, a RF-ID transmission input receiving unit 521 notifies a transmission unit 523 of a transmission request. Then, the transmission unit 523 reads the electronic catalog server information from the storage unit 522. An antenna unit 524 transmits the electronic catalog server information. The processing performed by the electronic catalog server information input device is presented in more detail with reference to a flowchart of FIG. 50.

Figure 51:
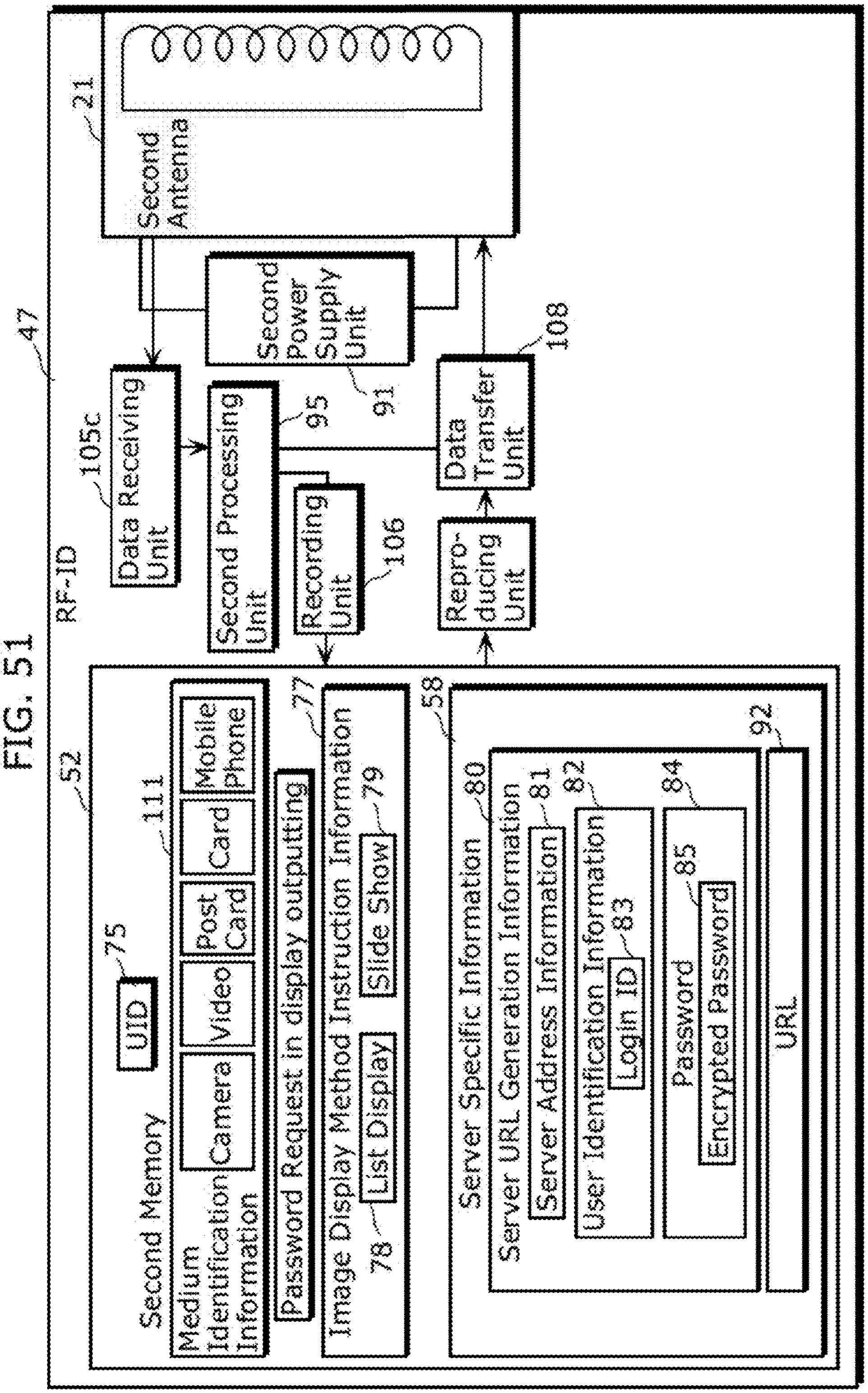
FIG. 51 is a block diagram of a RF-ID unit of an electronic catalog notification card.

FIG. 51 is a block diagram of a structure of the RF-ID unit 47 included in the electronic catalog notification card 502. A structure and processing of the RF-ID unit 47 are the same as those described in the first and second embodiments. The second power supply unit 91 obtains current from signals received by the second antenna 21, and provides power to each unit in the electronic catalog notification card 502.

Received information is recorded into the second memory 52 via the data receiving unit 105, the second processing unit 95, and the recording unit 106.

Figure 52:
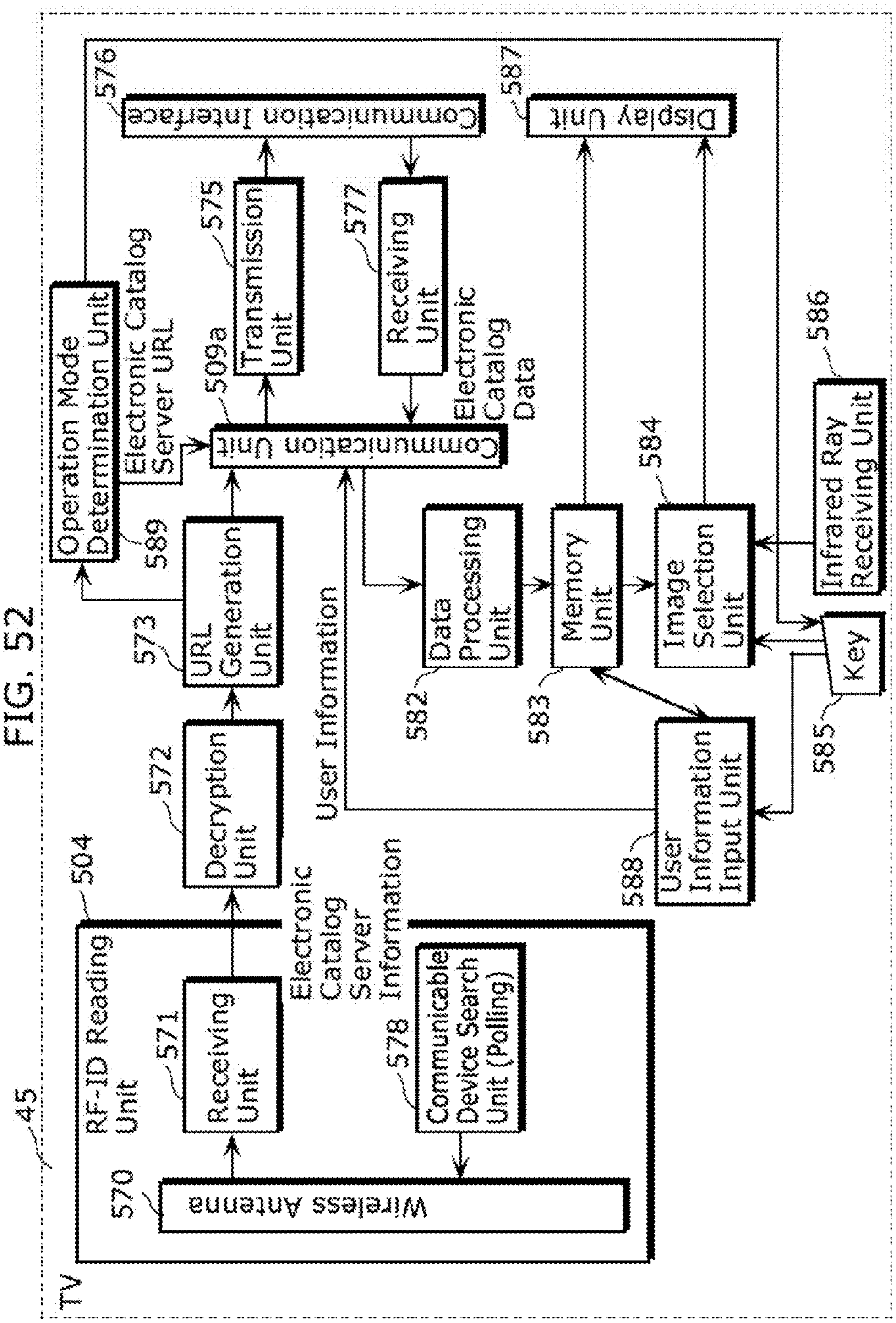
FIG. 52 is a block diagram of a TV displaying an electronic catalog.

FIG. 52 is a functional block diagram of a structure of the TV 45. The structure of the TV 45 according to Embodiment 3 differs from the structure of the TV 45 according to Embodiment 2 in that a user information input unit 588 is added. The user information input unit 588 receives the user information and stores the user information into a memory unit 583 temporarily. The user information is an attribute of the customer user and previously inputted by the customer user himself/herself. The user information is preferably gender or age information of the customer user. The user information may be other information, such as a residence or a family structure, which is private information for selecting product/service data in the electronic catalog. The user information is transmitted to the electronic catalog server via the communication unit 509, together with the URL of the electronic catalog server generated by the URL generation unit. In the same manner as described in Embodiment 1, in Embodiment 3, when the customer user moves the electronic catalog notification card 502 into proximity of a RF-ID reader 504 of the TV 45, the TV 45 receives the electronic catalog server information and thereby generates a URL of the server to connect to the server. The details of this processing are the same as those described in Embodiment 1 with reference to FIGS. 7 to 20.

Figure 53:
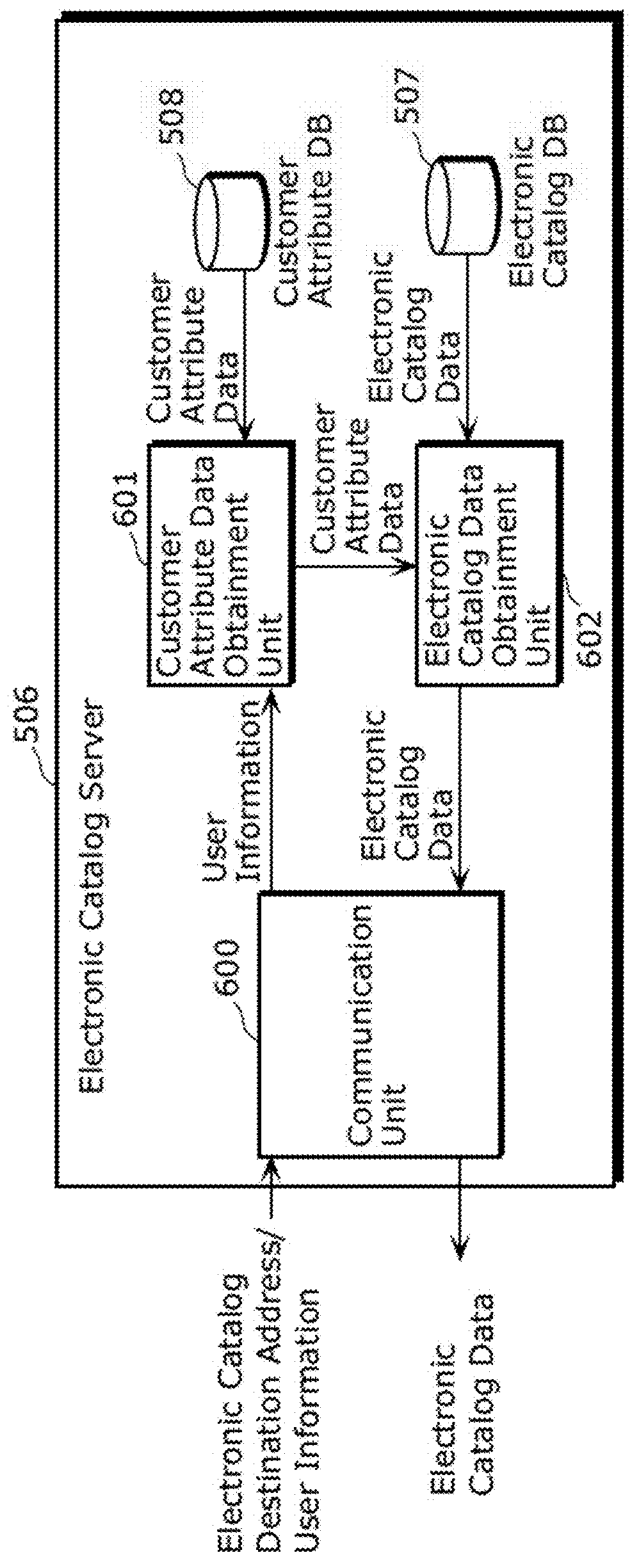
FIG. 53 is a block diagram of an electronic catalog server.
Figure 54:
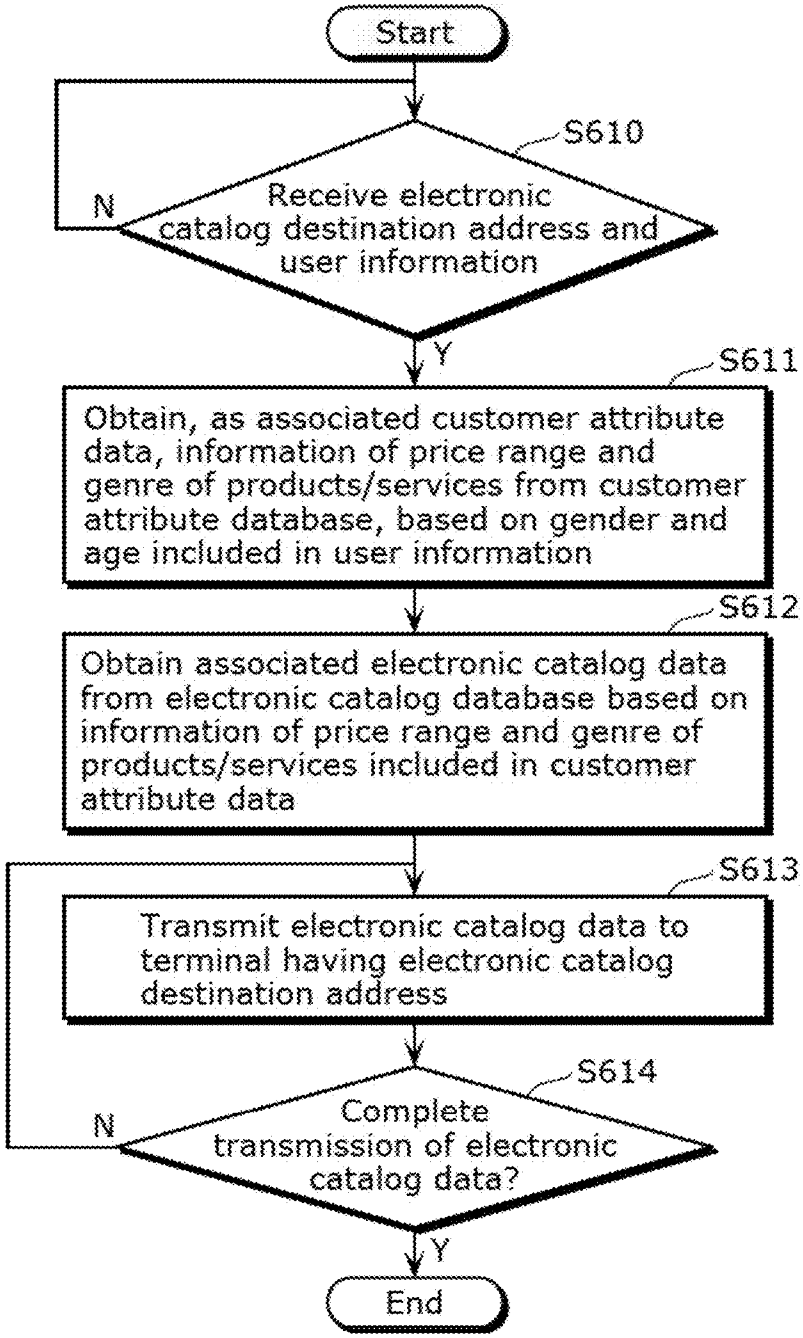
FIG. 54 is a flowchart of steps of processing performed by the electronic catalog server.

FIG. 53 is a functional block diagram of a structure of the electronic catalog server 506. The electronic catalog server 506 receives an electronic catalog destination address and the user information from the TV 45 via a communication unit 600. The electronic catalog destination address is a network address of the TV 45 on a network to which the TV 45 and the electronic catalog server 506 belong. Next, based on the user information received by the customer attribute data obtainment unit, the electronic catalog server 506 obtains customer attribute data from the customer attribute database 508. For instance, if the user information includes a gender and an age of the customer user using the TV 45, the electronic catalog server 506 obtains, as the customer attribute data, information of a product/service genre and a product/service price range which are in association with the age and gender of the customer user, based on the customer attribute database 508 having a data structure illustrated in FIG. 57. Then, the electronic catalog data obtainment unit 602 obtains the electronic catalog data from the electronic catalog database 507 based on customer attribute data. For example, if the customer attribute data includes product/service genres and product/service price ranges, the electronic catalog server 506 obtains, as the electronic catalog data, all of product/service data corresponding to the product/service genres and the product/service price ranges, from the electronic catalog database 507 having a data structure illustrated in FIG. 58. The electronic catalog server 506 transmits the electronic catalog data obtained by the electronic catalog data obtainment unit 602 to the TV 45 having the electronic catalog destination address, via a communication unit 600. The processing performed by the electronic catalog server 506 is presented in more detail in a flowchart of FIG. 54.

Figure 55:
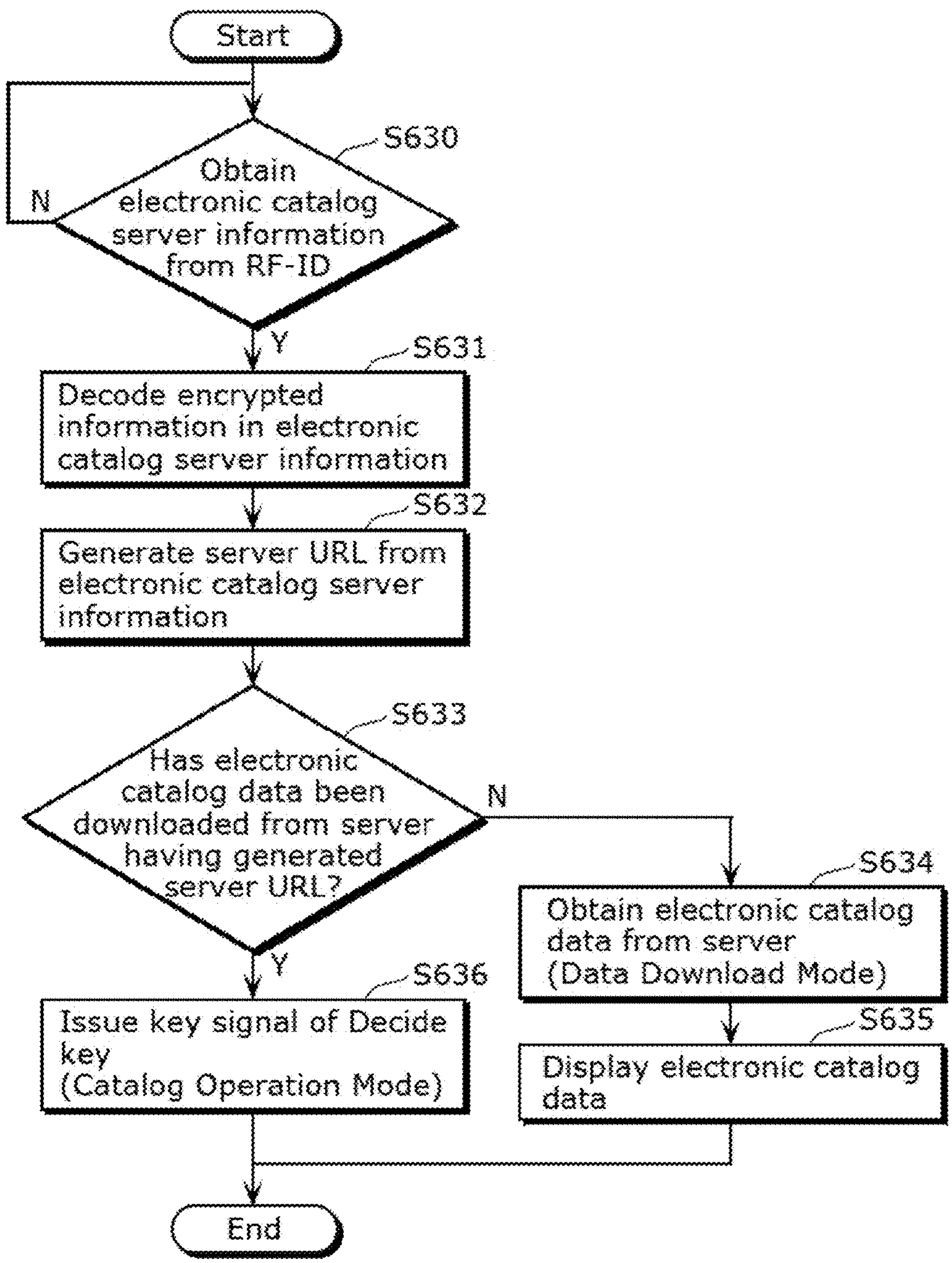
FIG. 55 is a flowchart of steps of processing performed by a TV displaying the electronic catalog.

The following describes processing of the TV 45 after downloading the electronic catalog data, with reference to a flowchart of FIG. 55. The processing regarding obtaining of the electronic catalog server information from the RF-ID unit in Steps S630 to S632 is the same whichever the electronic catalog data is downloaded or not. At S633, it is determined whether or not the electronic catalog data associated with the electronic catalog server information received from the RF-ID unit has already been downloaded and displayed. If the electronic catalog data has not yet been downloaded, then the TV 45 downloads the electronic catalog data from the server at S634 and displays the electronic catalog data at S635. The download processing is the same as the download processing described in Embodiment 1.

Figure 56:
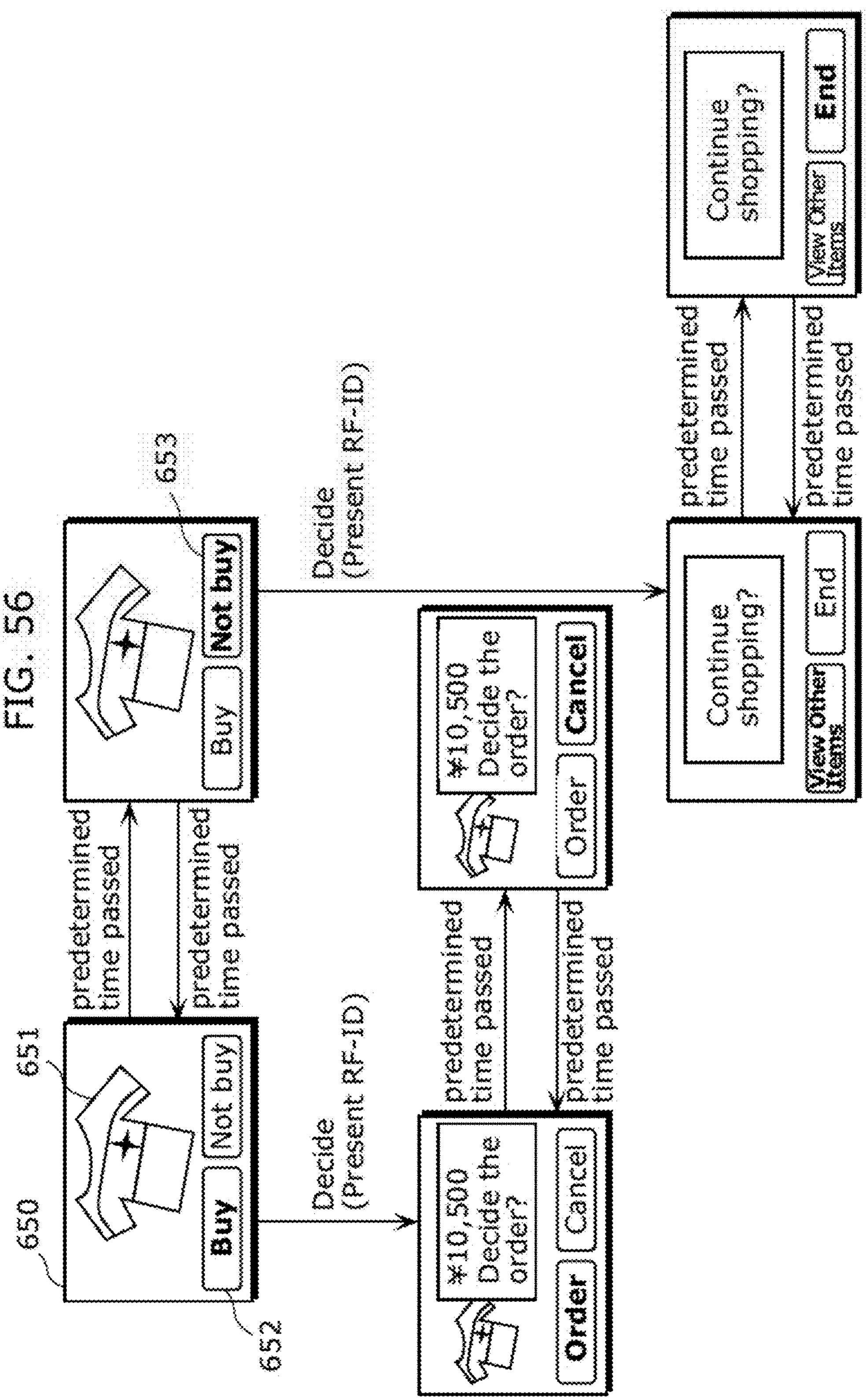
FIG. 56 is a diagram illustrating screen display of the electronic catalog.

If it is determined at S633 that the electronic catalog data has already been downloaded, then the TV 45 issues a signal of a predetermined key (for example, a signal of a Decide key) to execute operations for the displayed electronic catalog data (S636). Here, as illustrated in an example of a screen display of the electronic catalog data in FIG. 56, a screen presents the customer user with a few of options for a next operation to be executed by the customer user for the displayed electronic catalog data. Then, a focus circulates among the options on the screen (as illustrated as options 652 and 653 in FIG. 56) to indicate one of them as a selection candidate every time a predetermined time period passes. This allows the customer user to execute an operation for selecting or purchasing each product in the electronic catalog data, for example, only by presenting the electronic catalog notification card 502 having the RF-ID unit 47 to the TV 45, when the focus indicates a desired option of the customer user.

The second memory 52 according to Embodiment 3, which is embedded in the RF-ID unit 47 on the electronic catalog notification card 502, may be a Read Only Memory (ROM). In this aspect, the electronic catalog server information input device 500 serves as a RF-ID memory data input unit in manufacturing the RF-ID unit, or a RF-ID memory data input means in a RF-ID manufacturing system. In general, a RF-ID unit having a ROM unit is inexpensive more than a RF-ID unit having a rewritable memory. Therefore, the RF-ID unit having a ROM allows the provider user sending a great number of electronic catalog notification cards to reduce a cost.

It should be noted that it has been described in Embodiment 3 that a focus circulates among the options on the screen of the TV 45 (as illustrated as options 652 and 653 in FIG. 56) to indicate one of them as a selection candidate every time a predetermined time period passes. However, the method of operating the electronic catalog data displayed on the screen by using the electronic catalog notification card 502 having the RF-ID unit 47 is not limited to the above. For example, it is also possible that the receiving unit 571 of the TV 45 sequentially receive pieces of information from the RF-ID unit and counts the sequential receiving processes, then thereby calculates a time period (RF-ID proximity time period) during which the RF-ID unit is in proximity of the TV 45, and eventually moves a focus indicating a selection candidate displayed on the screen based on the RF-ID proximity time period. With the above structure, the following operation for the electronic catalog is possible. Only when the RF-ID unit is in proximity of the TV, the focus displayed on the screen is circulated to change the selection candidate. If the RF-ID unit is away from the TV, the focus is stopped. After a predetermined time period after stopping of the focus, the selection candidate on which the focus is stopped is decided as selection. In this operation for the electronic catalog, the customer user can actively operate the electronic catalog by using the RF-ID unit, without waiting for the focus, which automatically circulates among options every predetermined time period, to arrive at a user's desired option.

It should also be noted that it has been described in Embodiment 3 that the electronic catalog server information input device 500 has the key input receiving unit 520 which receives inputs by the input keys operated by the provider user in order to obtain the electronic catalog server information. However, the following configuration is also possible. That is, the electronic catalog server information input device 500 has a communication interface to communicate with the image server. The image server holds the server information to be transmitted to the electronic catalog server information input device 500. The electronic catalog server information input device 500 receives the server information from the image server, in order to obtain the server information. This configuration in which the server information is stored in the image server allows the electronic catalog server information input device 500 to eliminate inputting to the image server. Especially, when a plurality of the electronic catalog server information input devices 500 are operated for a single image server, this configuration is highly convenient.

The conventional techniques have a program that users who are not familiar with operations of digital devices such as personal computers should learn operations of the devices to do online shopping. However, the system according to Embodiment 3 enables users using electronic catalogs to do online shopping and the like, simply by bringing received cards or post cards into proximity of TVs. Therefore, even users who are not familiar with online terminals such as personal computers and mobile phones can easily enjoy shopping on TV screens.

[Embodiment 4]

Embodiment 4 according to the present invention is described below.

Figure 59:
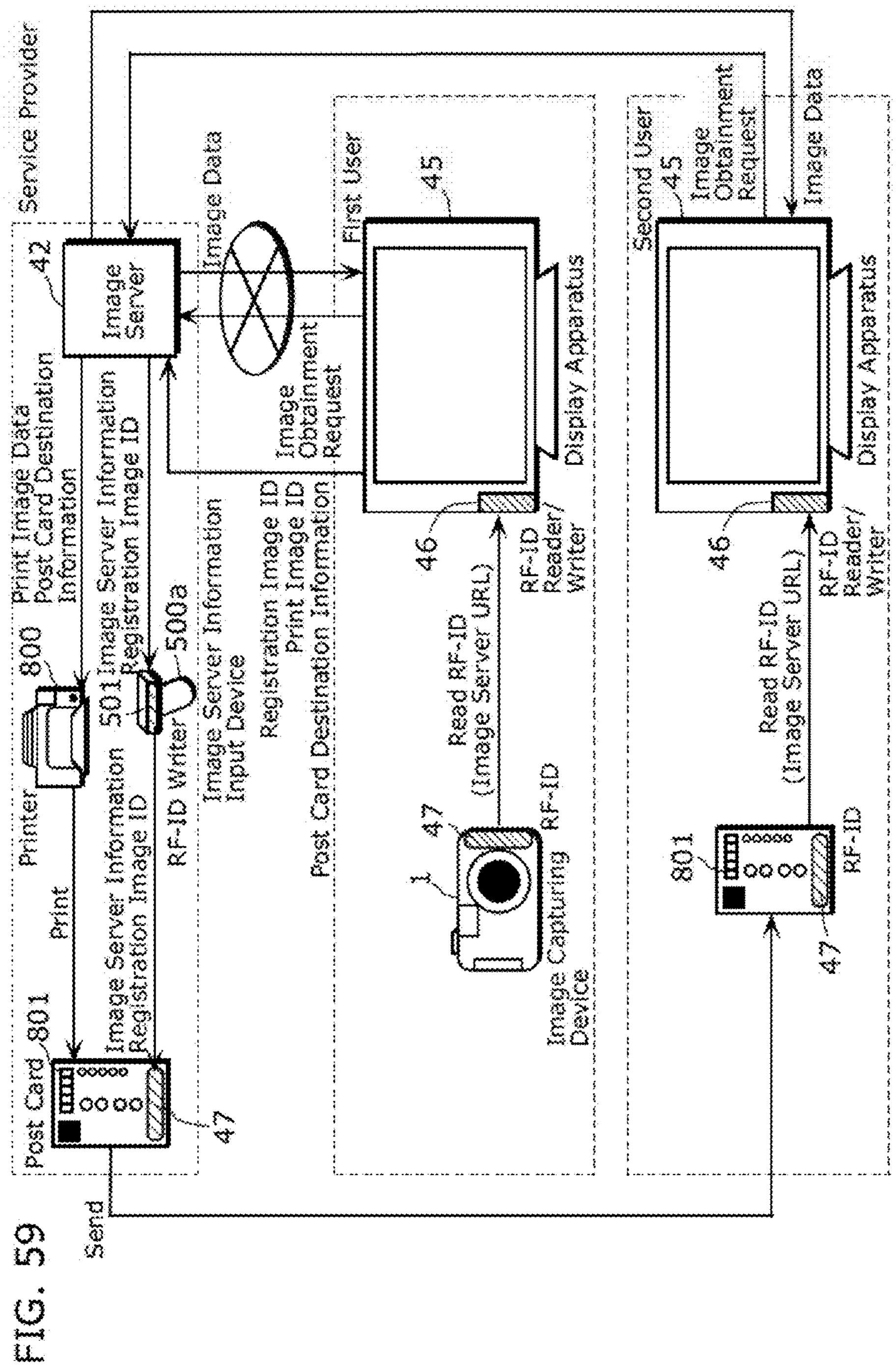
FIG. 59 is a schematic diagram of a RF-ID-attached post card mailing system.

FIG. 59 is a schematic diagram of Embodiment 4. In Embodiment 4, it is described a method of sending, to a remote location, a post card attached with RF-ID used to access an image server. First, a first user, who is a sender of a post card, brings the image capturing device 1 having the RF-ID unit 47 into proximity of the RF-ID reader/writer 46 of the TV 45. Thereby, the TV 45 generates a server URL used to connect the TV 45 to the image server 42, thereby obtains image data from the image server 42, and eventually displays the image data on a screen. This processing is the same as described in Embodiment 1. Next, by using an input means such as a remote controller of the TV 45, the first user selects an image(s) to be printed on a post card and images to be registered in association with the post card (in other words, images to be shown to a second user living in a remote location), from among the image data displayed by the TV 45. In addition, the first user inputs address information such as a destination address of the post card by using the remote controller or the like. The TV 45 transmits, to the image server 42, ID of the image selected by the first user to be printed on the post card (hereinafter, referred to as "print image ID"), ID of the images to be registered for the post card (hereinafter, referred to as "registration image ID"), and the destination information of the post card (hereinafter, referred to as "post card destination information"). The image server 42 retrieves the image data identified by the print image ID and then transmits the image data and the post card destination information to a printer 800. The printer 800 prints the image data and the post card destination information on the post card. In addition, to the image server information input unit 500, the image server 42 transmits the registration image ID received from the TV 45, together with image server information. The image server information includes: a sever address such as a URL; server login ID; a server login password; an image display password, image display information indicating whether the image data (images) is to be displayed in a list (as thumbnails) or sequentially (as a slide show); and medium identification information indicating a medium, such as a card or post card, to which RF-ID is to be attached. The image server information input device 500 writes the image server information and the registration image ID to the RF-ID unit 47 of the post card on which the image and the destination information are printed by the printer 800. The post card 801 applied with printing and RF-ID writing is mailed to the printed destination. Thereby, the second user, who is designated by the first user as being the destination, receives the post card 801. When the second user brings the mailed post card 801 into proximity of a RF-ID reader/writer 46 of a TV 45 of the second user, the TV 45 of the second user obtains the image server information and the registration image ID from the RF-ID unit 47, downloads the images identified by the registration image ID, and displays the downloaded images.

The structure and processing of the image capturing device 1 according to Embodiment 4 are the same as described in Embodiment 1.

Figure 60:
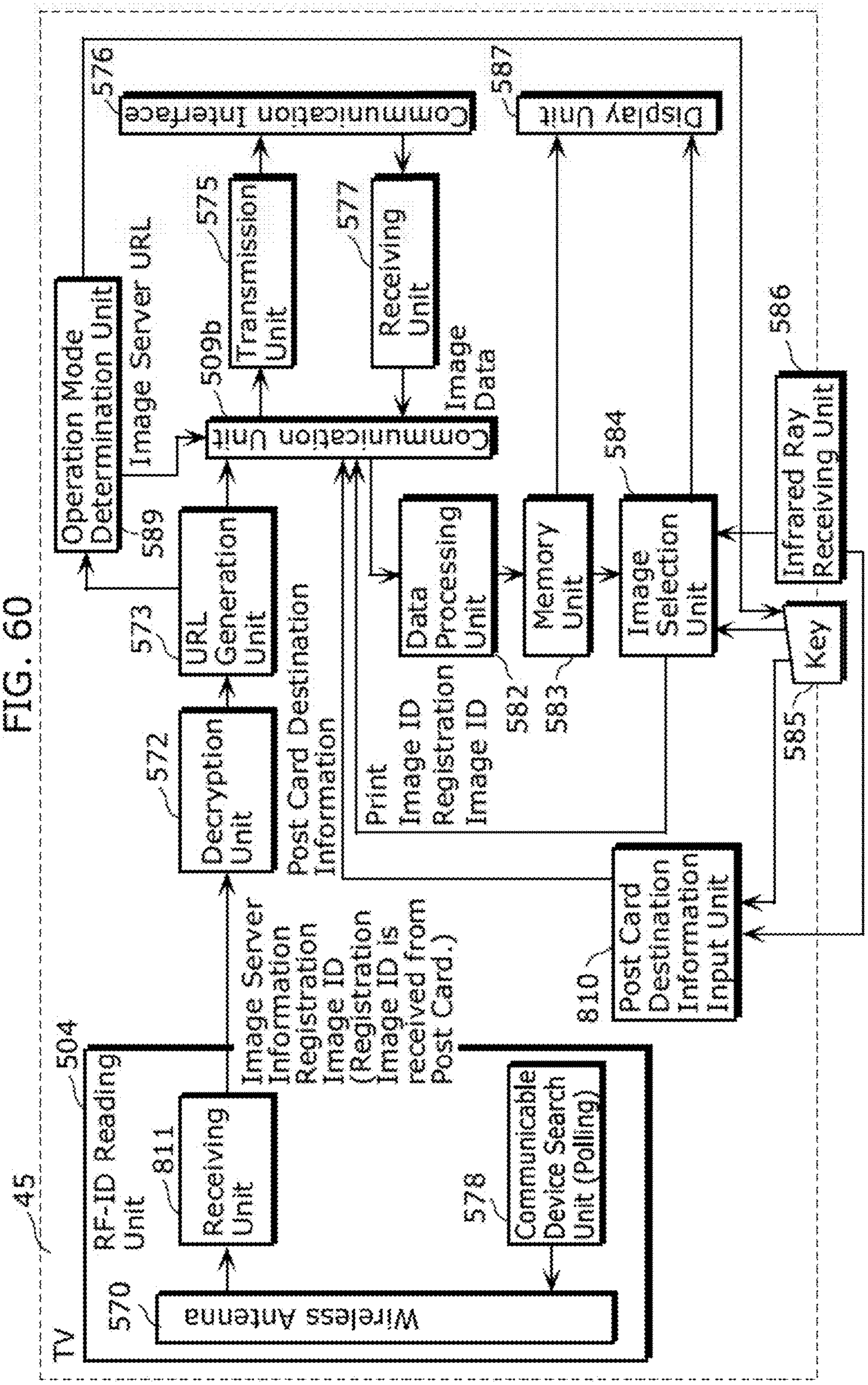
FIG. 60 is a block diagram of a TV in the RF-ID-attached post card mailing system.
Figure 61:
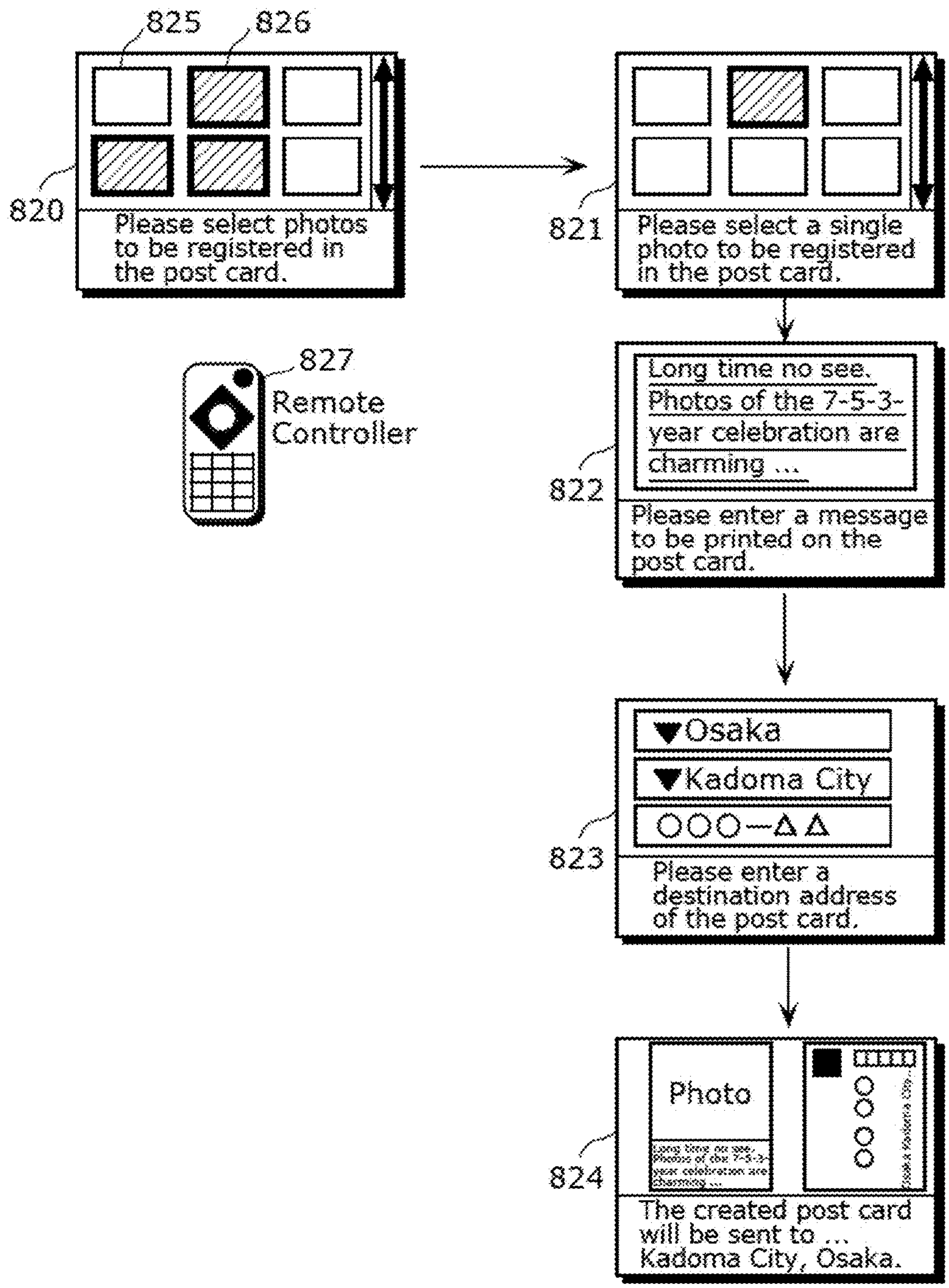
FIG. 61 is a diagram illustrating screen display in image selection operation by the RF-ID-attached post card mailing system.

FIG. 60 is a block diagram of a structure of the TV 45 according to Embodiment 4. A receiving unit 811 receives the image server information from the RF-ID unit 47 of the image capturing device 1 or the post card 801 via a wireless antenna 570. If the RF-ID unit 47 of the post card 801 holds the registration image ID, the receiving unit 811 receives also the registration image ID. An image selection unit 584 receives an image selection operation from the user via a key unit 585 and an infrared ray receiving unit 586, and thereby obtains ID of an image which the first user has selected to be printed on the post card (namely, the print image ID) and ID of images which the first user has selected to be registered for the post card (namely, the registration image ID). Then, the image selection unit 584 provides the obtained IDs to the communication unit 509 (the network communication unit 509). FIG. 61 illustrates an example of a screen display on the TV 45 in the image selection operation. In FIG. 61, 821 is a screen display from which the first user selects an image to be printed on the post card. 820 in FIG. 61 is a screen display from which the first user selects images to be registered for the post card. A post card destination information input unit 810 receives a character input operation of the first user via the key unit 585 and the infrared ray receiving unit 586. Thereby, the post card destination information input unit 810 obtains the post card destination information including an address and a name of the destination of the post card. Then, the post card destination information input unit 810 provides the post card destination information to the communication unit 509. 823 in FIG. 61 is an example of a screen display on which the post card destination information is inputted. The communication unit 509 transmits the post card destination information, the print image ID, and the registration ID to the image server via a transmission unit 575 and a communication interface 576.

Figure 62:
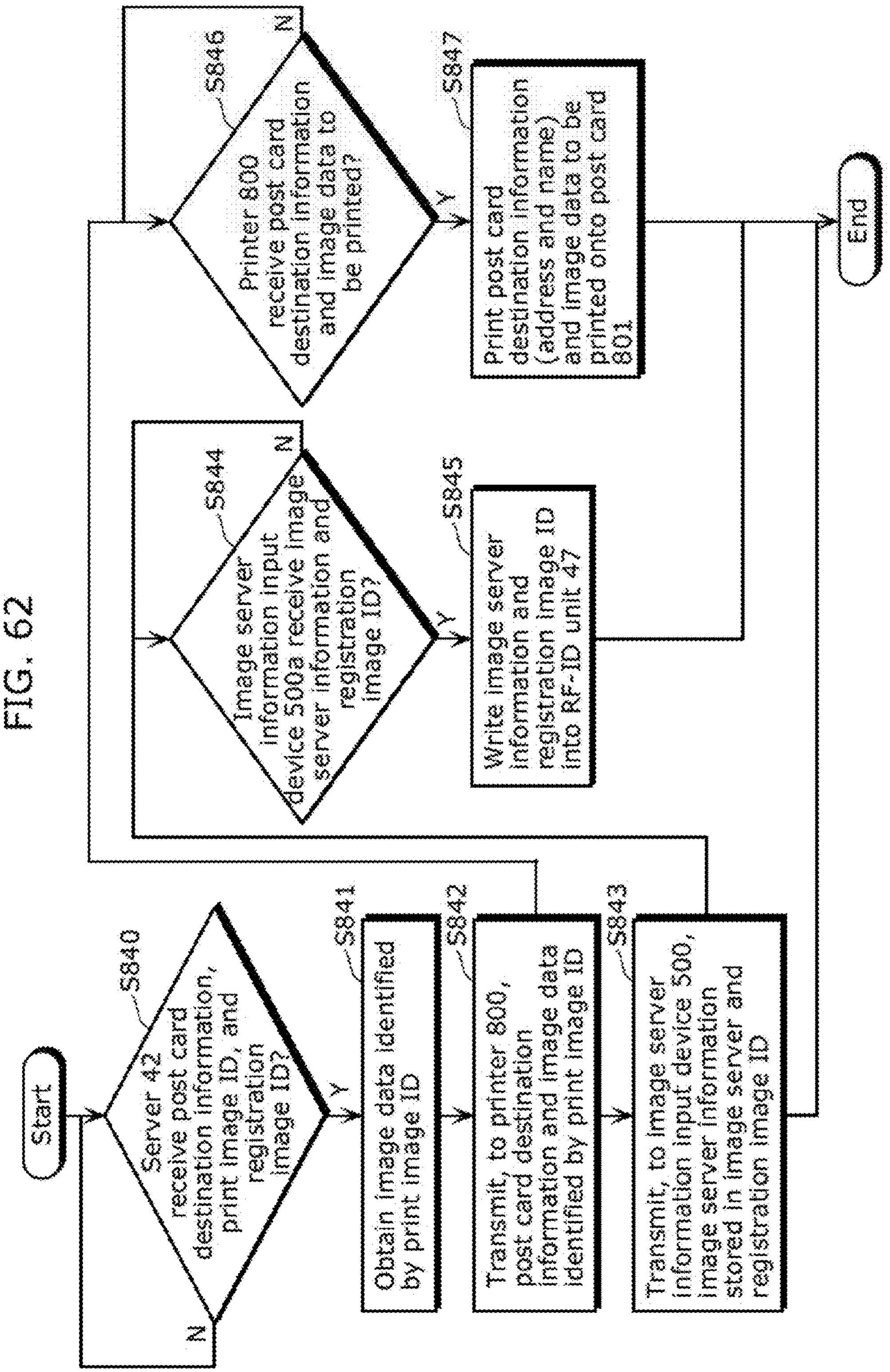
FIG. 62 is a flowchart of steps of processing performed by an image server in the RF-ID-attached post card mailing system.

FIG. 62 is a flowchart of processing performed prior to mailing of the post card 801, by the image server 42, the printer 800, and the image server information input device 500. When the post card 801 is applied with printing and RF-ID writing, the post card 801 is mailed to the printed destination. The second user, who is designated by the first user as being the destination, receives the post card 801. When the second user presents the received post card 801 to the TV 45, the receiving unit 811 receives the image server information and the registration image ID from the RF-ID unit 47 via the wireless antenna 570. A decryption unit 572 decrypts encrypted information in the image server information and the registration image ID. Next, the URL generation unit 573 generates a URL from which only images identified by the registration image ID from among images stored in the image server 42 are downloaded to the TV 45. More specifically, the URL generation unit 573 may designate an internal directory of the server in the generated URL or may use a method of embedding the registration image ID to the URL as a URL option. By using the URL generated by the URL generation unit 573 to designate the server, the TV 45 accesses the image server to obtain the images, which is the same as described in more detail in Embodiment 1.

It should be noted that it has been described in Embodiment 4 that the user inputs the destination information to the TV 45, but the user may input not only the destination information such as an address and a name but also a message to be printed with an image on a post card. The TV 45 receives the input message together with the destination information and provides them to the image server 42. The printer 800 prints them on the post card. 822 in FIG. 61 illustrates an example of a screen of the TV 45 on which a message to be printed is inputted. If the user can select an image to be printed on the post card and also input an message added to the image, a flexibility in generating a post card with RF-ID is increased.

It should also be noted that the TV 45 according to Embodiment 4 may allow the user to perform operations for images displayed on the TV 45 by using the post card with RF-ID, in the same manner as described in Embodiment 3 for the processing in which the user operates an electronic catalog displayed on a screen by using RF-ID.

As described above, the system according to Embodiment 4 enables the user to mail a post card with RF-ID to a person living in a distant location, without creating a post card attached with RF-ID by the user himself/herself. In addition, when the user wishes to print the image(s) stored in the image server onto the post card to be mailed, the system allows the user to perform operation on a TV screen to select an image(s) to be printed. As a result, high usability is achieved.

Conventionally, if the user intends to show images, on a large screen display device, to a different user living in a remote location, the user in the remote location needs to learn operations of the device (apparatus), an operation acquirer has to go to the remote location to operate the device, or the display device in the remote location should be remotely controlled. The system according to Embodiment 4, however, enables such a user in a remote location to easily view images by a simple operation, for example, by bringing a physical medium such as a post card with RF-ID into proximity of a display device.

[Embodiment 5]

Figure 63:
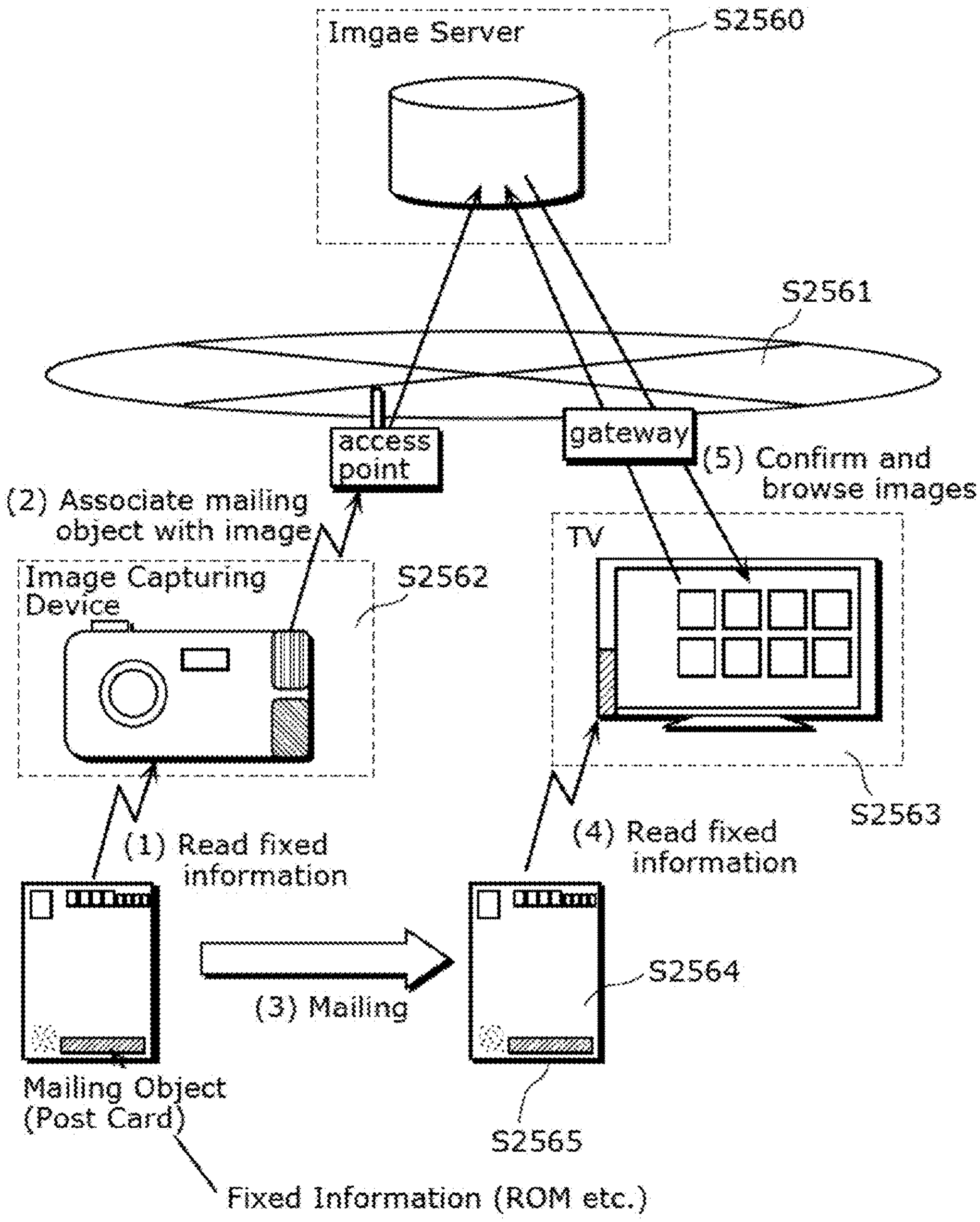
FIG. 63 is a block diagram of a system according to Embodiment 5 of the present invention.

Embodiment 5 of the present invention has the following configuration. A mailing object such as a post card is written with fixed information. The image capturing device associates the fixed information with an image or a group of images (image data) stored in the server. A reproduction side reads the fixed information from the RF-ID attached to the post card or the like in order to display the image data associated with the fixed information. The configuration is illustrated in FIG. 63. Referring to FIG. 63, first, the image capturing device reads the fixed information from the mailing object, then associates the fixed information with an image(s), and registers information of the association (hereinafter, referred to as "association information) into the server. When the user receives the mailing object for which the registration is completed, the user brings the mailing object into proximity of a RF-ID reader of a TV to read the fixed information from the mailing object. The TV queries the server using the fixed information, and thereby displays the image(s) associated with the mailing object.

Embodiment 5 is characterized in that the RF-ID information in the mailing object is not rewritable (ROM) or in non-rewritable environments so that image data in the server is associated with the mailing object without rewriting the fixed information in the mailing object.

<Image Uploading and Mailing Object Associating by Image Capturing Device>

The images captured by the image capturing device are uploaded to the server using the method described in the prior embodiments. Here, an identifier is assigned to an uploaded image or image group. The identifier makes it possible to identify the image or an group of images stored in the server.

The following describes a method of associating (i) an image or image group which is captured and uploaded to the server by the image capturing device with (ii) fixed information recorded in a RF-ID tag of a mailing object. FIG. 64 illustrates examples of the fixed information recorded in the RF-ID tag of the mailing object.

(a) in FIG. 64 illustrates fixed information including: mailing object UID unique to the mailing object; and information such as an address for accessing the image server. (b) in FIG. 64 illustrates fixed information including: the mailing object UID; and information such as an address for accessing a relay server. (c) in FIG. 64 illustrates fixed information including the mailing object UID only. The fixed information may also include a login ID, password information, and the like for accessing the server. It is assumed in Embodiment 5 that such information necessary to access the server is included in a URL including the address information.

Figure 65:
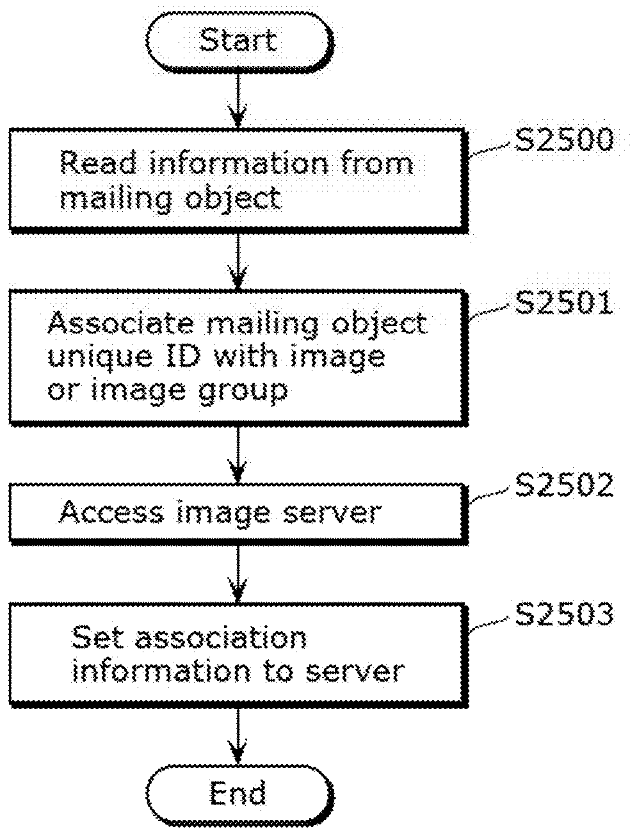
FIG. 65 is a flowchart of processing for associating an image capturing device with an image server, according to Embodiment 5 of the present invention.

FIG. 65 is a flowchart of processing performed by the image capturing device to associate the RF-ID with image data stored in the server, when the image capturing device has a RF-ID reader function.

First, the image capturing device reads information from the RF-ID of the mailing object by using the RF-ID reader (S2500). In more detail, the second antenna 21 illustrated in FIG. 3 communicates with the RF-ID of the mailing object, and thereby the data receiving unit 105 receives the fixed information from mailing object. Then, the second processing unit 95 performs processing to provide the fixed information of the mailing object to the first processing unit 35 via the recording unit 106, the second memory 52, and the recording/reproducing unit 51. The first processing unit 35 associates the mailing object UID read from the mailing object with an image or image group, according to designation from the user (S2501). Then, the image capturing device accesses the server 42 via the first antenna 20 (S2502). Thereby, the image capturing device registers, to the server 42, the association information regarding the association between the mailing object UID and the image data stored in the server 42 (S2503).

Figure 66:
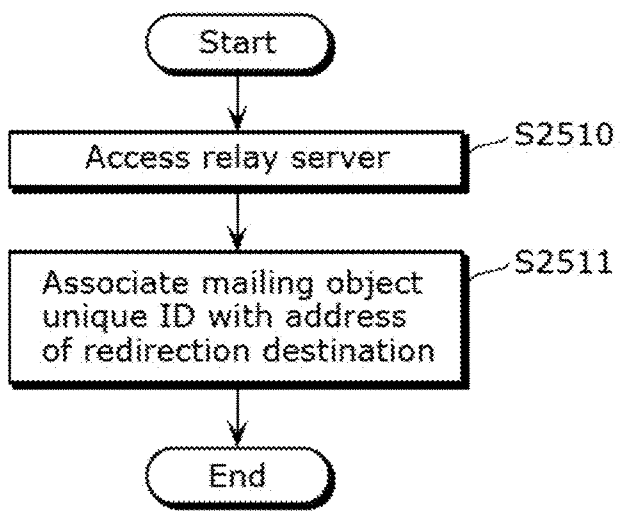
FIG. 66 is a flowchart of processing for registering the image capturing device with a relay server, according to Embodiment 5 of the present invention.

If the fixed information read from the mailing object includes an address of the image server or a URL including the address, then the processing is completed. On the other hand, if the fixed information read from the mailing object does not include an address of the image server or a URL including the address, the image capturing device sets a relay server (FIG. 66).

In order to set a relay server, the image capturing device accesses the relay server (S2510). In more detail, if the fixed information read from the mailing object includes an address of a relay server or a URL including the address, then the image capturing device accesses the relay server. Otherwise, the image capturing device accesses a relay server that is previously set for the image capturing device.

After accessing the relay server, the image capturing device sets, in a database of the relay server, association information regarding association between the mailing object UID and the server that is a redirection destination (transfer destination) (S2511). Thereby, association between the mailing object UID and an address of the transfer destination is registered in the database of the relay server.

If the image capturing device does not have a RF-ID reader function and the mailing object is printed with a two-dimensional code or the like indicating information of the RF-ID reader, the image capturing device captures an image of the two-dimensional code using an image capturing unit to read information from the code so that the image capturing device can obtain the same information as the fixed information recorded in the RF-ID unit of the mailing object. The two-dimensional code may be a QR Code™, a PDF417, Veri Code, Maxi Code, or the like. Any other code can be used if the image capturing device can read information from the code by capturing an image of the code. In addition, the same advantages as described in Embodiment 5 can be produced by using a bar-code in a one-dimensional direction only, although a printing area is increased.

Figure 67:
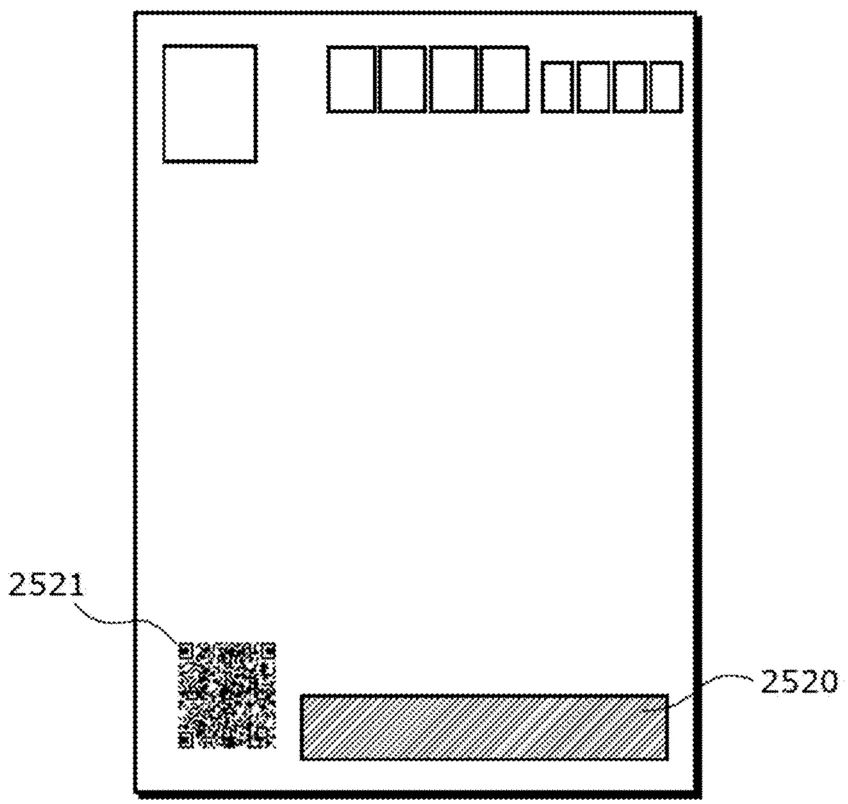
FIG. 67 is a diagram illustrating an example of a mailing object attached with a 2-dimensional code.

FIG. 67 is an example of the mailing object attached with a RF-ID unit 2520 and printed with a two-dimensional code 2521 indicating the same information as that recorded on the RF-ID unit 2520. A flow of processing data when the two-dimensional code is read by the image capturing device is described with reference to the block diagram of FIG. 3. The two-dimensional code printed on the mailing object is captured by the image capturing unit 30, then converted into an imaged by the video processing unit 31, and provided to the first processing unit 35 via the recording/reproducing unit 32. The first processing unit 35 analyzes the captured two-dimensional code and retrieves the information from the two-dimensional code. The information indicated by the two-dimensional code is basically the same as the information recorded in the RF-ID unit. The information indicated by the two-dimensional code includes at least the mailing object UID.

Figure 68:
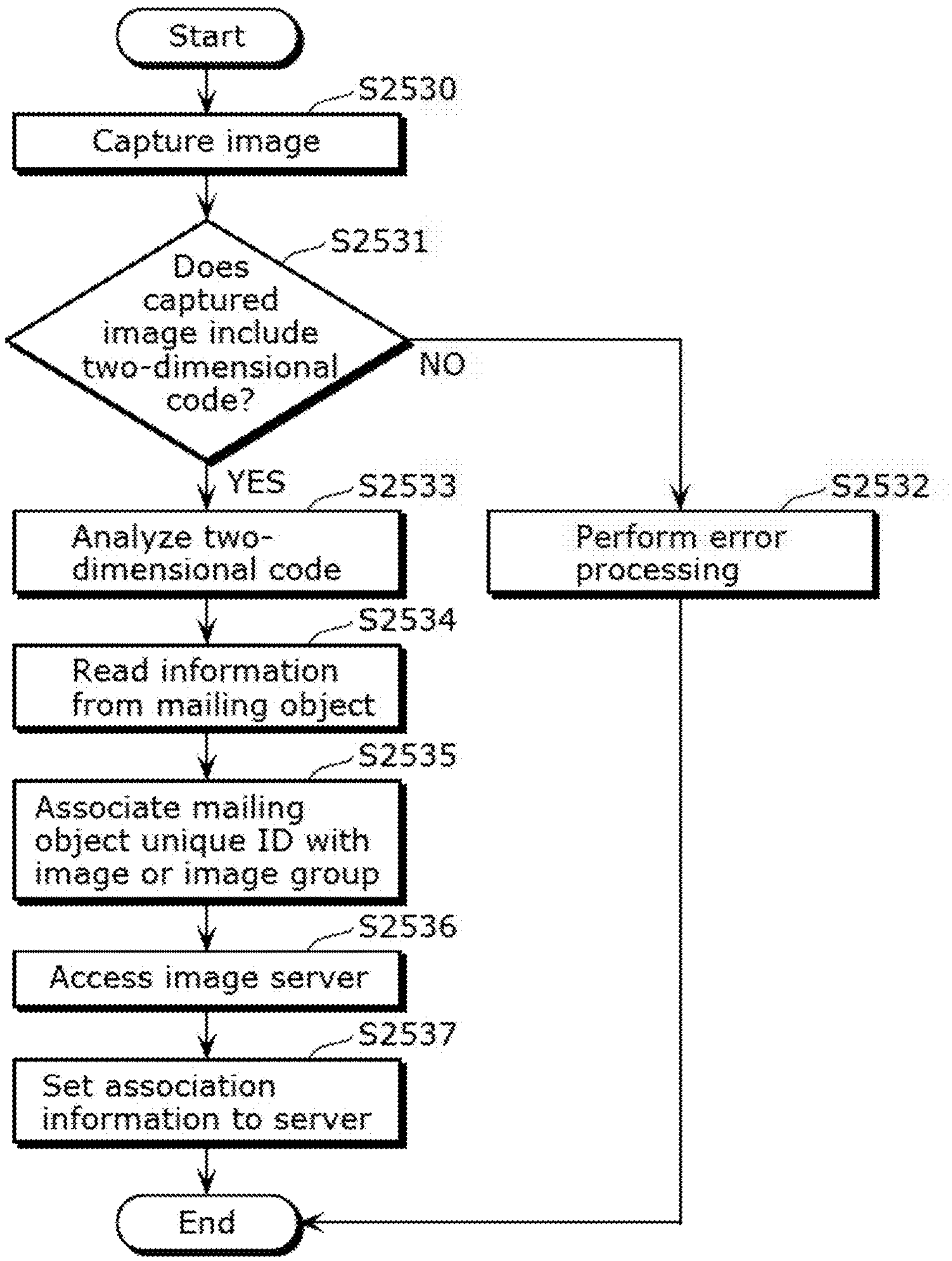
FIG. 68 is a flowchart of processing using a 2-dimensional bar-code of the image capturing device according to Embodiment 5 of the present invention.

The following describes a flow of the processing from reading the information of the two-dimensional code to associating the information with an image or image group in the server with reference to FIG. 68.

Firstly, the image capturing unit captures an image of the two-dimensional code (S2530). Then, it is determined whether or not the captured image is a two-dimensional code (S2531). If the captured image is not a two-dimensional code, then error processing is performed (S2532). Or, normal image capturing processing may be performed. On the other hand, if the captured image is a two-dimensional code, then the two-dimensional code is analyzed (S2533). Thereby, information is read from the mailing object based on the result of the analysis (S2534). After reading the fixed information from the mailing object, the image capturing device associates the mailing object UID with image data stored in the server (S2535). Then, the image capturing device accesses the server (S2536). Then, the image capturing device sets the association information to the server (S2537). The Steps S2535 to S2537 are the same as the Steps S2501 to S2503 in FIG. 65. Here, if the readout information does not include an address of the image server or a URL including the address, then the image capturing device performs transfer setting to a relay server. The transfer setting to the relay server has been previously described with reference to FIG. 66.

As described above, by reading information from the two-dimensional bar-code printed on the mailing object, it is possible to complete to associate the information recorded on the RF-ID unit with image data stored in the server.

If the image capturing device does not have a RF-ID reader function and the mailing object is not printed with a code such as a two-dimensional code, the image capturing device can read information from the mailing object if the user manually inputs, to the image capturing device, the mailing object UID and the URL such as a sever address which are printed on the mailing object. The user inputs the information using buttons 7 to 15 illustrated in FIG. 2. In this aspect, the URL and the mailing object UID may be printed directly as a plane text or coded to be a code which the user easily inputs.

As described above, even if the image capturing device does not have a RF-ID reader function and the mailing object is not printed with a two-dimensional code, it is possible to associate the mailing object with image data stored in the server.

<Image Reproducing and Viewing by Using RF-ID on Mailing Object>

Next, the steps for viewing images stored in the server on the TV using the mailing object for which association is completed.

Figure 69:
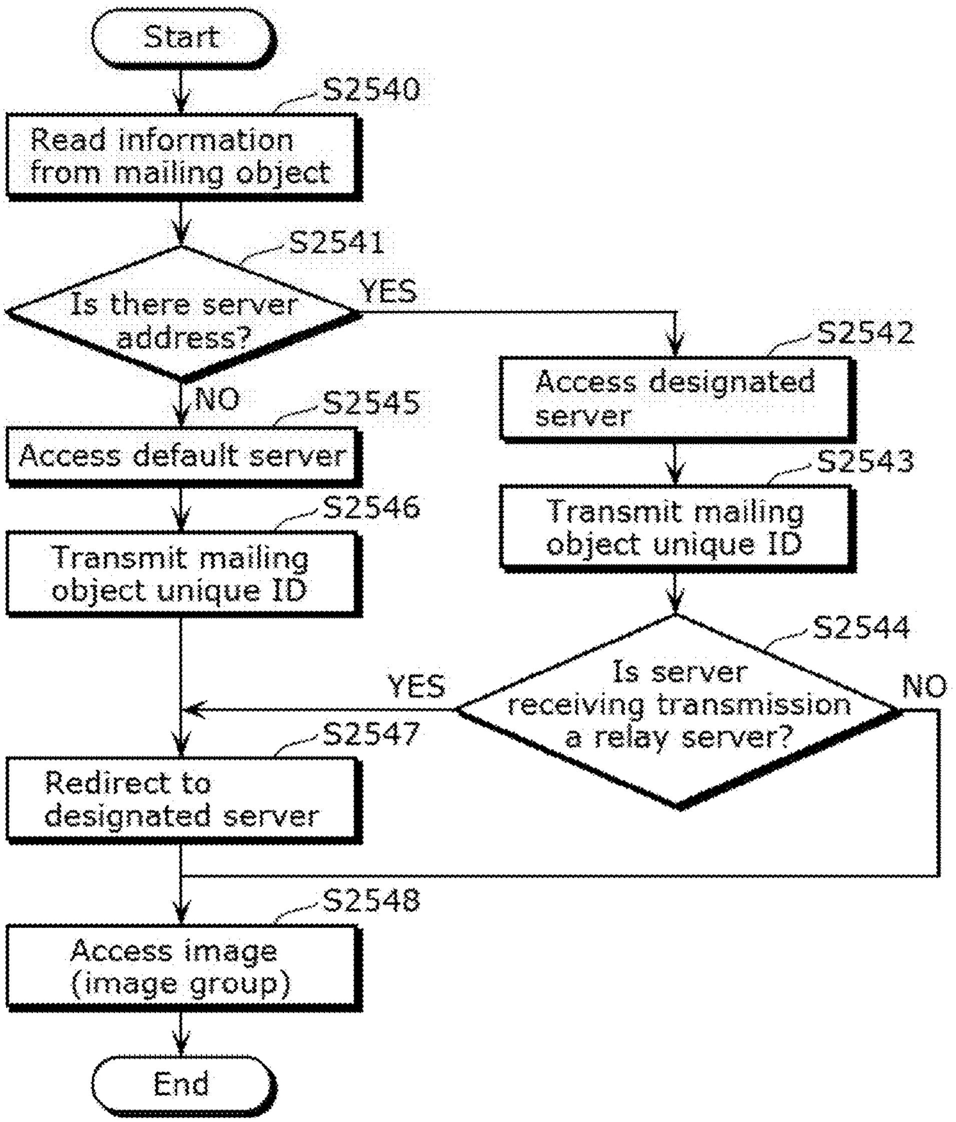
FIG. 69 is a flowchart of processing performed by a TV according to Embodiment 5 of the present invention.

FIG. 69 is a flowchart of processing performed by the TV to read RF-ID from the mailing object and eventually access the image server.

When the user brings the mailing object into proximity of the RF-ID reader of the TV, the TV reads information of the RF-ID on the mailing object (S2540). Then, a determination is made as to whether or not the readout information includes a sever address or a URL including the server address (S2541). If the readout information includes a sever address or a URL including the sever address, then the TV accesses the designated server (S2542). Then, the TV transmits the mailing object UID (S2543). Then, a determination is made as to whether or not the server receiving the transmission is a relay server (S2544). If the server is a relay server, then the relay server redirects to a server (the image sever) designated in the relay server (S2547). Thereby, the TV accesses an image or image group in the image server (S2548). On the other hand, if it is determined at S2544 that the server receiving the transmission is the image server, then redirecting is not performed and access to the image server is performed (S2548). Moreover, if it is determined at S2541 that the readout information does not include a sever address, then the TV accesses a server set by a predetermined default (S2545). Then, the TV transmits the mailing object UID to the default server (S2546). The default server redirects to a server (the image server) designated in the default server (S2547) to access the image server.

Figure 70:
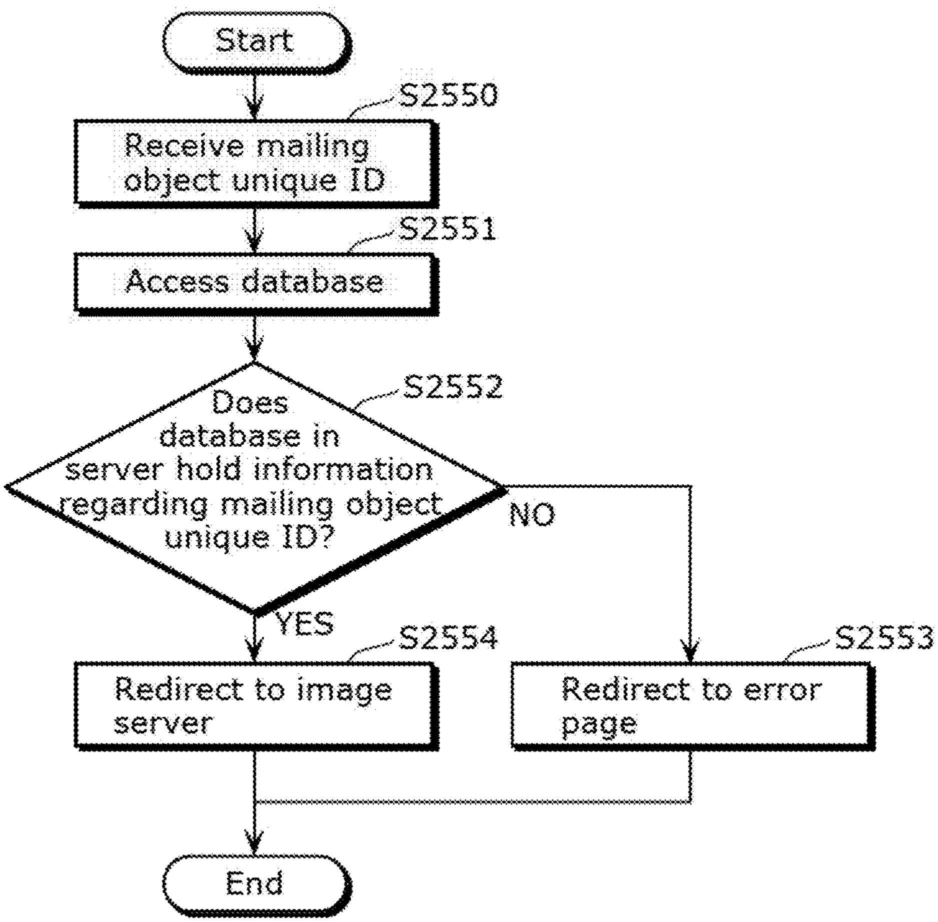
FIG. 70 is a flowchart of processing performed by the relay server according to Embodiment 5 of the present invention.

Here, if association between the mailing object UID and the designated server as a destination of the relay is not registered in a database of the relay or default server, the relay or default server redirects to an error page. FIG. 70 is a flowchart of processing performed by the relay or default server after receiving the mailing object UID. When the relay or default server receives the mailing object UID (S2550), the server searches its database for information regarding the mailing object UID (S2551). Then, the relay or default server determines whether or not the database holds information regarding the mailing object UID (S2552). If the database holds the information, then the relay or default server redirects to a server associated with the mailing object UID in the database (S2554). On the other hand, if the database does not hold the information (in other words, if there is no association), then the relay or default server redirects to an error page (S2553).

As described above, the mailing object having fixed information in the RF-ID is previously associated with image data stored in the image server. Thereby, when the mailing object with the association is presented to the TV, the user can view an image or image group in the server which is associated with the mailing object UID, without rewriting of the RF-ID of the mailing object. Therefore, even if the user is away from home and cannot rewrite the RF-ID of the mailing object, or even if the RF-ID of the mailing object is not rewritable, the user can associate images in the server with the mailing object. As a result, the user allows a person receiving the mailing object to view the images associated with the mailing object.

It should be noted that it has been described in Embodiment 5 that the mailing object UID is transmitted after accessing the server. However, it is also possible to generate a URL from the mailing object UID and the sever address recorded on the mailing object in order to access the server. In this aspect, it is possible to perform the access to the server and the transmission of the mailing object UID at the same time.

According to Embodiment 5, even in an environment where the RF-ID cannot be rewritten, such as in a sight-seeing location, for example, the user can associate captured images with a post card and send the post card to a friend. Thereby, the friend receiving the post card presents the post card to a TV to view the images the user captured in the sight-seeing location. As explained above, even in an environment where the RF-ID cannot be rewritten, the user can create a mailing object associated with images in the server and then send the mailing object to a person to which the user desires to show the images.

If the image capturing device has a RF-ID writer function to rewrite the RF-ID of the mailing object, the processing is the same as processing performed by the TV for associating the mailing object with image data in the server, which will be described below in Embodiment 6. Therefore, the processing is not described in Embodiment 5.

[Embodiment 6]

In Embodiment 6, the following configuration is described. The image capturing device captures images and uploads the images to the image server. Then, a user transmitting the images (hereinafter, referred to as a "sending user") selects an image group from the images in the server. Information for accessing the selected image group is recorded in the RF-ID on the mailing object. The mailing object is mailed to a user receiving the images (hereinafter, referred to as a "receiving user"). The receiving user accesses the image group in the image server by using the RF-ID on the mailing object.

Figure 71:
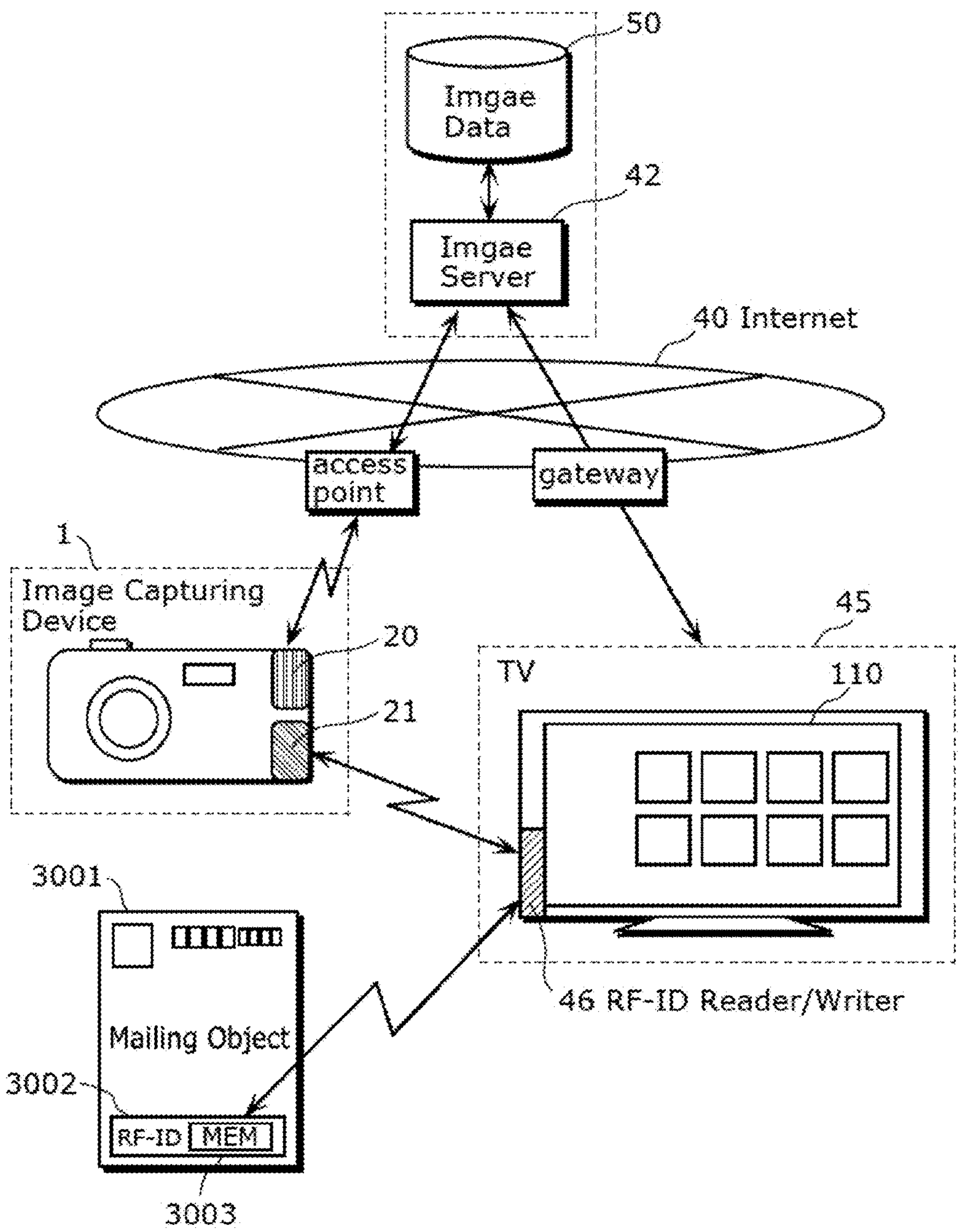
FIG. 71 is a schematic diagram of an image transmitting side according to Embodiment 6 of the present invention.
Figure 72:
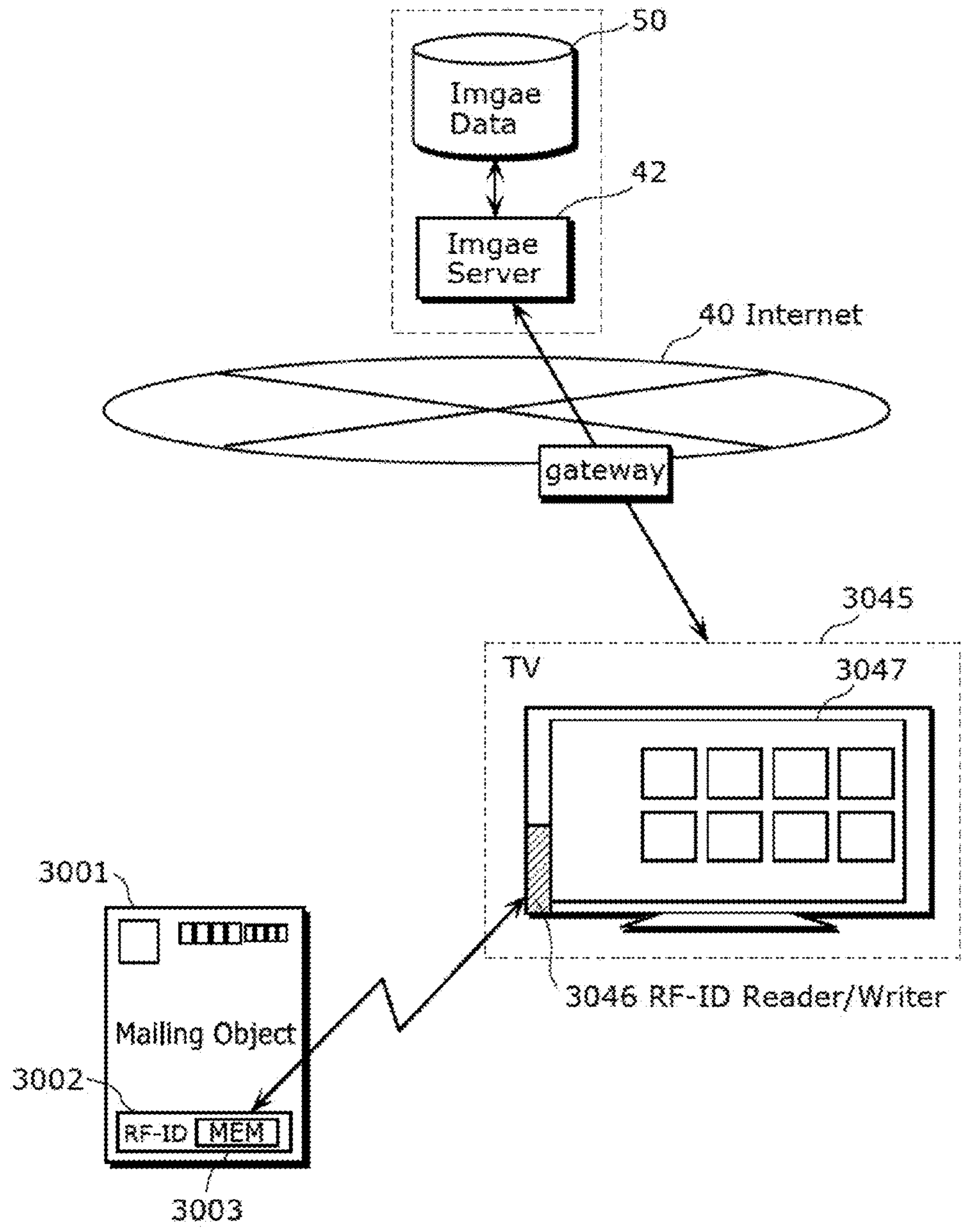
FIG. 72 is a schematic diagram of an image receiving side according to Embodiment 6 of the present invention.

FIG. 71 is a schematic diagram of a configuration of an image transmission side according to Embodiment 6 of the present invention. FIG. 72 is a schematic diagram of a configuration of an image receiving side according to Embodiment 6 of the present invention. Here, the same reference numerals of FIGS. 1 and 3 are assigned to the identical elements of FIGS. 71 and 72, so that the identical elements are not explained again below.

In FIGS. 71 and 72, a mailing object 3001 is a post card, envelope, or letter paper which is mailed from the image transmission side to the image receiving side. A RF-ID unit 3002 is a rewritable RF-ID. At least part of the RF-ID unit 302 is a rewritable memory unit 3003. The RF-ID unit 3002 is attached to or incorporated into the mailing object 3001 in order to be sent to the image receiving side together with the mailing object. Furthermore, as described in the prior embodiments, the memory unit 3003 in the RF-ID unit 3002 holds the medium identification information for identifying that the medium having the RF-ID unit 3002 is a mailing object.

Referring to FIG. 72, a TV 3045 is a TV display device provided in the image receiving side. The TV 3045 has the same function as that of the TV 45 in FIG. 71 described in the prior embodiments. Like the TV 45 in FIG. 71, the TV 3045 includes a RF-ID reader/writer 3046 (corresponding to the RF-ID reader/writer 46 in FIG. 71) and a display unit 3047 (corresponding to the display unit 110 in FIG. 71). The TV 3045 is connected to the Internet 40 via a network connection means not shown.

Next, the processing performed by the above configuration is described.

<Image Group Selecting and Mailing Object Writing by Image Transmission Side>

In the image transmission side in FIG. 71, images captured by the image capturing device 1 are transmitted to a wireless access point via the second antenna 20 in the image capturing device 1 used for wireless communication, such as a wireless LAN or WiMAX. The images are recorded as the image data 50 onto the image server 42 via the internet 40. Then, the image capturing device 1 is moved into proximity of the RF-ID reader/writer 46 of the TV 45 in order to establish connection with the TV 45 by wireless communication via the first antenna 21 of the image capturing device 1 used for RF-ID. The TV 45 obtains, from the image capturing device 1, information for accessing the image data 50 in the image server 42. Then, the TV 45 downloads the images of the image data 50 to be displayed on the display unit 110. The above processing is the same as described in the prior embodiments. The above is just a summary.

Next, the sending user checks the images displayed on the display unit 110 of the TV 45 in order to set transmission image selection information indicating whether or not each of the images is to be transmitted to the receiving user (in other words, whether or not each of the images is to be permitted to be viewed by the receiving user). The sending user can set also restriction on display for the receiving user, utility form information such as a slide show and printing, which is described in the prior embodiments. The transmission image selection information and the utility form information are transmitted to and recorded onto the image server. The image server manages, as an image group, a set of images selected as transmission images in the transmission image selection information.

Figure 73:
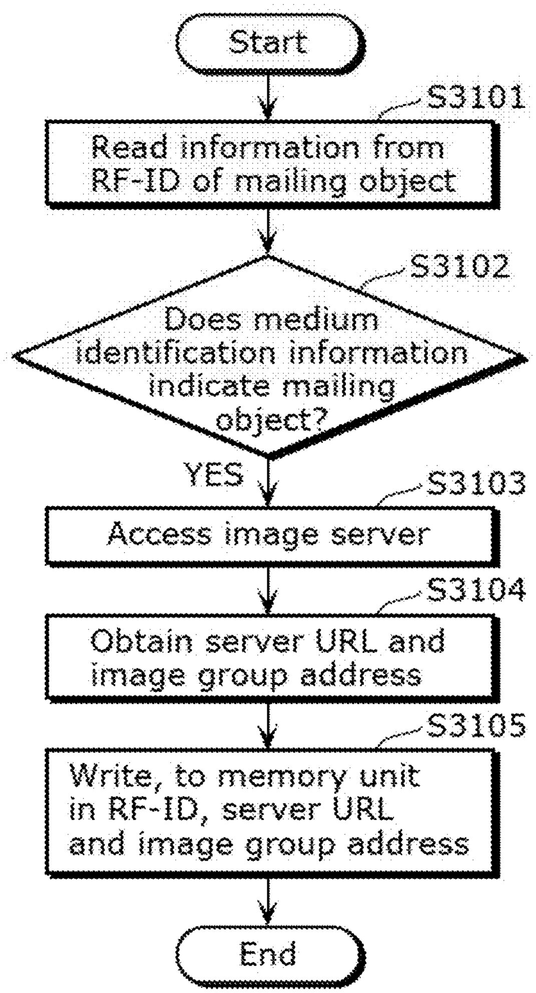
FIG. 73 is a flowchart of processing performed by a TV transmitting image according to Embodiment 6 of the present invention.

The following describes steps performed by the TV 45 for recording, onto the mailing object 3001, information regarding the image group selected by the sending use, with reference to a flowchart of FIG. 73.

It is assumed that transmission images have been selected and an image group set with the utility form information has been generated. Under the assumption, the sending user brings the mailing object 3001 having the RF-ID unit 3002 into proximity of the RF-ID reader/writer 46 of the TV 45 in order to establish wireless communication between the RF-ID unit 3002 and the RF-ID reader/writer 46.

When the TV 45 becomes able to communicate with the RF-ID unit 3002 on the mailing object 3001 via the RF-ID reader/writer 46, the TV 45 reads information from the memory unit 3003 (S3101). Then, the TV 45 determines whether or not the medium identification information indicates that the current communication partner is a mailing object (S3102). If the current communication partner is a mailing object, then the TV 45 proceeds to steps for writing to the mailing object. Here, if it is determined in Step S3102 that the current communication partner is not a mailing object, then the subsequent steps are not described here but the TV 45 proceeds to steps depending on a medium indicated by the medium identification information.

In order to write to the mailing object 3001, first, the TV accesses the image server 42 via the internet 40 (S3103). Thereby, the TV 45 obtains, from the image server 42, image group designation information, such as a server URL and an image group address, for allowing the image receiving side to access the image group in the image server 42 (S3104).

The TV 45 transmits the obtained image group designation information to the RF-ID unit 3002 on the mailing object 3001 via the RF-ID reader/writer 46 of the TV 45 in order to write the image group designation information to the memory unit 3003 in the mailing object 3001, and the RF-ID unit 3002 on the mailing object 3001 records the image group designation information to a rewritable region of the memory unit 3003 (S3105).

As described above, the mailing object 3001 on which the image group designation information is recorded is mailed by the sending user to a user of the image receiving side.

<Image Reproducing and Viewing by Image Receiving Side>

Figure 74:
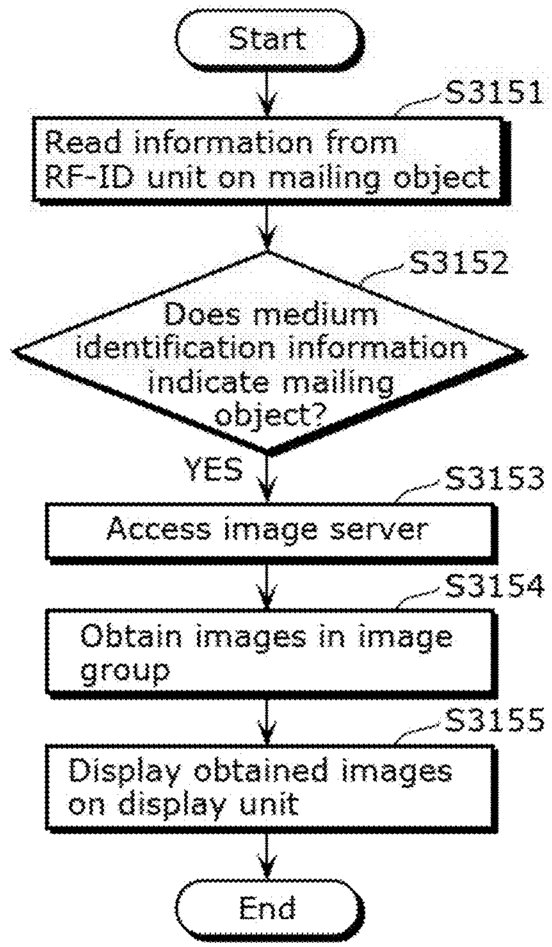
FIG. 74 is a flowchart of processing performed by a TV receiving image according to Embodiment 6 of the present invention.

Next, the image receiving side is described with reference to FIG. 72 illustrating the schematic block diagram of the image receiving side and FIG. 74 illustrating a flowchart of processing performed by the TV in the image receiving side.

Referring to FIG. 72, the receiving user receives the mailing object 3001 from the sending user. Then, the receiving user checks the RF-ID unit 3002 or characters or design indicated on the mailing object 3001 to determine whether the mailing object is incorporated with a means for accessing images. Here, the receiving user needs only to understand that the receiving user can access to the images by using the mailing object 3001. The receiving user does not need to care about the image group designation information and the like in the RF-ID unit 3002.

In order to reproduce and view the images, the receiving user brings the mailing object 3001 into proximity of the RF-ID reader/writer 3046 of the TV 3045 in the image receiving side so as to start viewing of the images.

If the RF-ID unit 3002 on the mailing object 3001 is in enough proximity of the RF-ID reader/writer 3046 of the TV 3045, the RF-ID reader/writer 3046 supplies power to the RF-ID unit 3002 of the mailing object 3001 via antennas (not shown) of both the RF-ID reader/writer 3046 and the RF-ID unit 3002 in order to activate the RF-ID unit 3002. Thereby, wireless communication between the TV 3045 and the RF-ID unit 3002 of the mailing object 3001 starts. When the wireless communication starts, the TV 3045 reads information from the memory unit 3003 of the RF-ID unit 3002 (S3151).

A determination is made as to whether or not the medium identification information in the readout information indicates that the current communication partner is a mailing object (S3152). If the current communication partner is a mailing object, then the TV 3045 proceeds to processing of reading the image group designated by the sending user from the image server 42.

The access to the image server 42 makes it possible to generate a URL for accessing the image group in the image server 42 by using the image group designation information in the information read by the RF-ID unit 3002 in Step S3151, such as an image group address, and thereby to access the image server 42 via the internet 40 (S3153).

The TV 3045 connected to the image server 42 at the above step obtains the images (the image group) which are permitted to be displayed, from among the image data 50 in the image server 42, based on the transmission image selection information indicating the image group managed by the image server 42 (S3154). Then, the TV 3045 displays the images on the display unit 110 (S3155).

Furthermore, according to the transmission image selection information indicating the image group managed by the image server 42 and the utility form information, the receiving user can use functions of, for example, reproducing the images as a slide show, printing the images, and downloading the images to a recording medium (not shown) attached to the TV 3045 or connected to the outside.

In addition, for image printing, the user can print the images by the printer on a LAN (not shown), and also ask, via the internet 40, a photograph print service provider to print the images.

As described above, with the above configuration according to Embodiment 6 of the present invention, the image group designation information is provided from the RF-ID unit 3002 on the mailing object 3001 to the TV 3045 in the image receiving side. Therefore, the receiving user does not need to input characters of a network access destination to obtain images, for example. In other words, the intuitive and simple operation of simply bringing the mailing object 3001 into proximity of the TV 3045 enables the receiving user to access the image data 50 stored in the image server 42. As a result, the receiving user can obtain images from the image server, without knowledge of complicated operations such as menu selection and character inputs.

It should be noted that it has been described in Embodiment 6 that the mailing object 3001 is previously attached or incorporated with the RF-ID unit 3002. However, the mailing object may be a general post card or letter paper attached with an independent RF-ID unit 3002 that is provided separately. In this aspect, the above effect can be produced by later attaching the RF-ID unit to the mailing object. This produces further advantages that the sending user can use Embodiment 6 for any desired mailing object.

It should also be noted that, if the access to the image server 42 requires a login operation, a server login ID and a server login password may also be written in Step S3105 into the rewritable region of the memory unit 3003 in the RF-ID unit 3002 on the mailing object 3001. Here, it is desirable that the login ID and the login password are not plane texts but are written in an encrypted format for security.

It should also be noted that it has been described in Embodiment 6 that the TV 45 in the image transmission side performs selection of transmission images, setting of the utility form information, and writing of the image group designation information to the RF-ID unit 3002 on the mailing object 3001. However, it is also possible that the image capturing device 1 having a RF-ID reader/writer function performs setting of the transmission image selection information and the utility form information and writing of the image group designation information, in order to produce the same effect as described above for obtaining images by the simple operation of the receiving user.

<Variation of Embodiment 6>

Figure 75A:
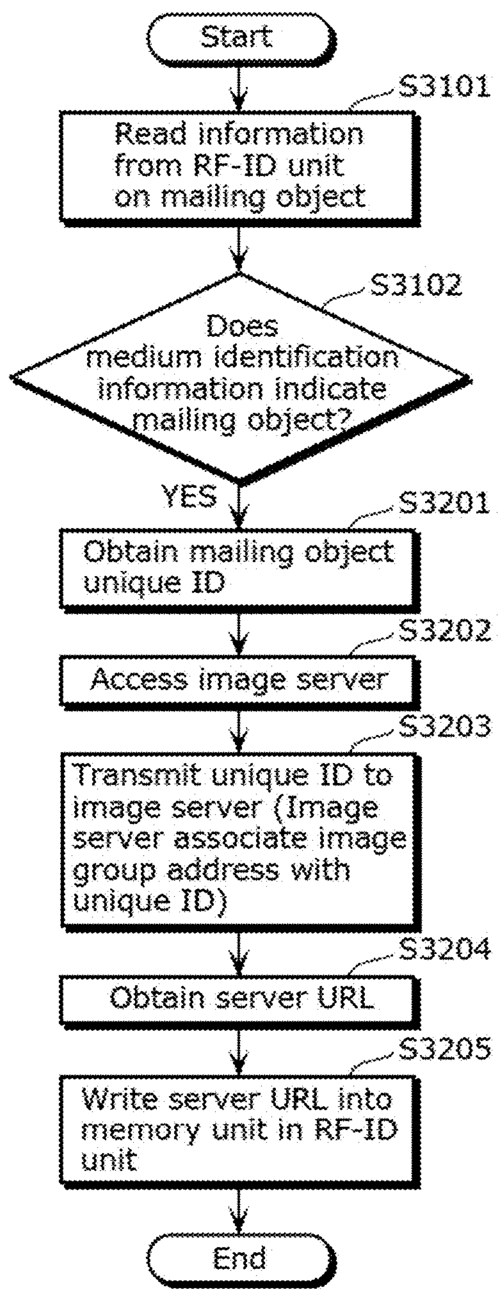
FIG. 75A is a flowchart of another example of processing performed by the TV transmitting image according to Embodiment 6 of the present invention.
Figure 75B:
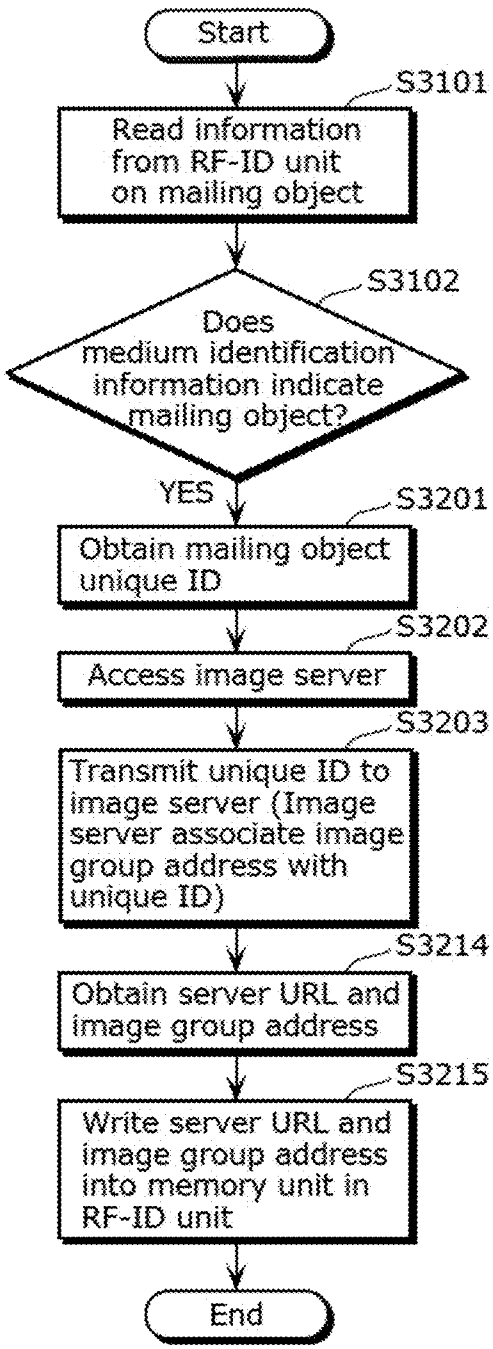
FIG. 75B is a flowchart of another example of processing performed by the TV transmitting image according to Embodiment 6 of the present invention.

FIGS. 75A and 75B are flowcharts of processing performed by the TV 45 in the image transmission side according to a variation of Embodiment 6 of the present invention. Here, the same step numerals of FIG. 73 are assigned to the identical steps of FIGS. 75A and 75B, so that the identical steps are not explained again below.

Figure 76:
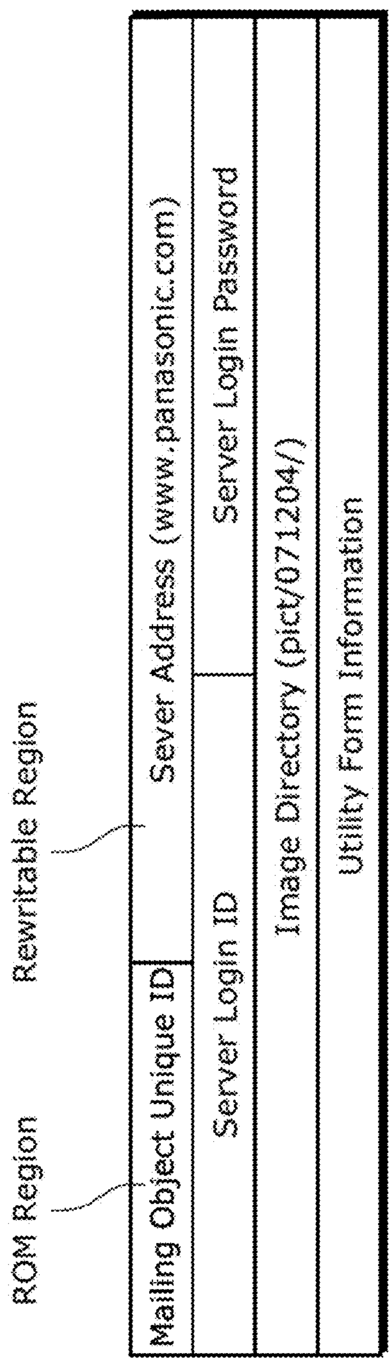
FIG. 76 is a table of an example of information recorded in a mailing object memory unit according to Embodiment 6 of the present invention.

According to the variation of Embodiment 6, the mailing object UID is previously recorded on the memory unit 3003 of the RF-ID unit 3002 on the mailing object 3001. Here, it is desirable to record the mailing object UID on a ROM region of the memory unit 3003 in order to reduce risks of data damages or data manipulation caused by accidental operations. FIG. 76 illustrates a diagram of an example of a data structure of the memory unit 3003.

The TV 45 in the image transmission side sets the transmission image selection information and the utility form information into the above-described RF-ID unit in order to designate an image group in the image serve 42. In this situation, the TV 45 performs processing according to the flowchart of FIG. 75A.

The TV 45 reads information from the RF-ID unit 3002 on the mailing object 3001 (S3101) and determines based on the medium identification information that the communication partner is a mailing object (S3102). After that, the TV 45 obtains the mailing object UID (S3201). The mailing object UID may be the information read in Step S3101 or be newly obtained from the RF-ID unit 3002. Next, the TV 45 accesses the image server 42 via the Internet 40 (S3202). The TV 45 transmits the mailing object UID to the image server 42, and thereby the image server 42 associates with the transmitted mailing object UID with an address of the image group and then stores the manages information of the association (association information) (S3203).

The TV 45 obtains, from the image server 42, the server URL enabling the image receiving side to access the image server 42 (S3204). The obtained server URL is written into the rewritable region of the memory unit 3003 in the RF-ID unit 3002 on the mailing object 3001 via the RF-ID reader/writer 46 (S3205).

As described above, if the image server associates the image group with the mailing object UID and then stores and manages the association information, the utility form information can be managed separately for each mailing object UID. Therefore, in the situation where there are a plurality of the mailing objects 3001, it is possible to change an operation for receiving images for each mailing object, namely, for each different receiving user.

If, in the configuration described in Embodiment 6, the image receiving side designates an image group for each mailing object, generates a different image group address for each designated image group, and writes the image group address into a corresponding RF-ID unit, the image transmission side needs complicated operations for designating image groups separately although the same advantages as those of Embodiment 6 can be obtained.

Therefore, when the sending user selects the same transmission image group for a plurality of mailing objects, it is preferable that the sending user records and manages different utility form information for each mailing object by using the mailing object UID as described earlier. Thereby, it is possible to reduce operations of the sending user, and to reduce a memory capacity of the image server because it is not necessary to hold pieces of the transmission image selection information separately, thereby producing further advantages.

The processing of FIG. 75B differs from the processing of FIG. 75A in thin Steps S3204 and S3205 are replaced by Steps S3214 and 3215. In Step 3214, the TV 45 obtains an image group address in addition to the server URL. In Step S3215, the TV 45 writes the image group address together with the server URL into the memory unit 3003 of the RF-ID unit 3002.

Thereby, when the image receiving side is to receive images, the image receiving side accesses the designated image group in the image server 42. Here, the access is permitted only when the mailing object UID of the image group stored and managed in the image server matches the mailing object UID used by the receiving server requesting the access. Thereby, security is increased.

Conventionally, if the user intends to show images, on a large screen display device (apparatus), to a different user living in a remote location, the user in the remote location needs to learn operations of the device, an operation acquirer has to go to the remote location to operate the device, or the display device in the remote location should be remotely controlled. However, like Embodiment 4, the system according to Embodiment 6 enables such a user in a remote location to easily view images by a simple operation, for example, by bringing a physical medium such as a post card with RF-ID into proximity of a display device. In Embodiment 4, generation of the post card with RF-ID and writing of data into the RF-ID is not performed by the user (who captures and sends images or who views the images), but by a service provider. In Embodiment 6, however, the sending user in the image transmission side performs generation of the post card with RF-ID and writing of data into the RF-ID.

[Embodiment 7]

In Embodiment 7 of the present invention, a method of changing setting for a device (apparatus) by using a RF-ID card according to Embodiment 7 of the present invention is described.

Figure 77:
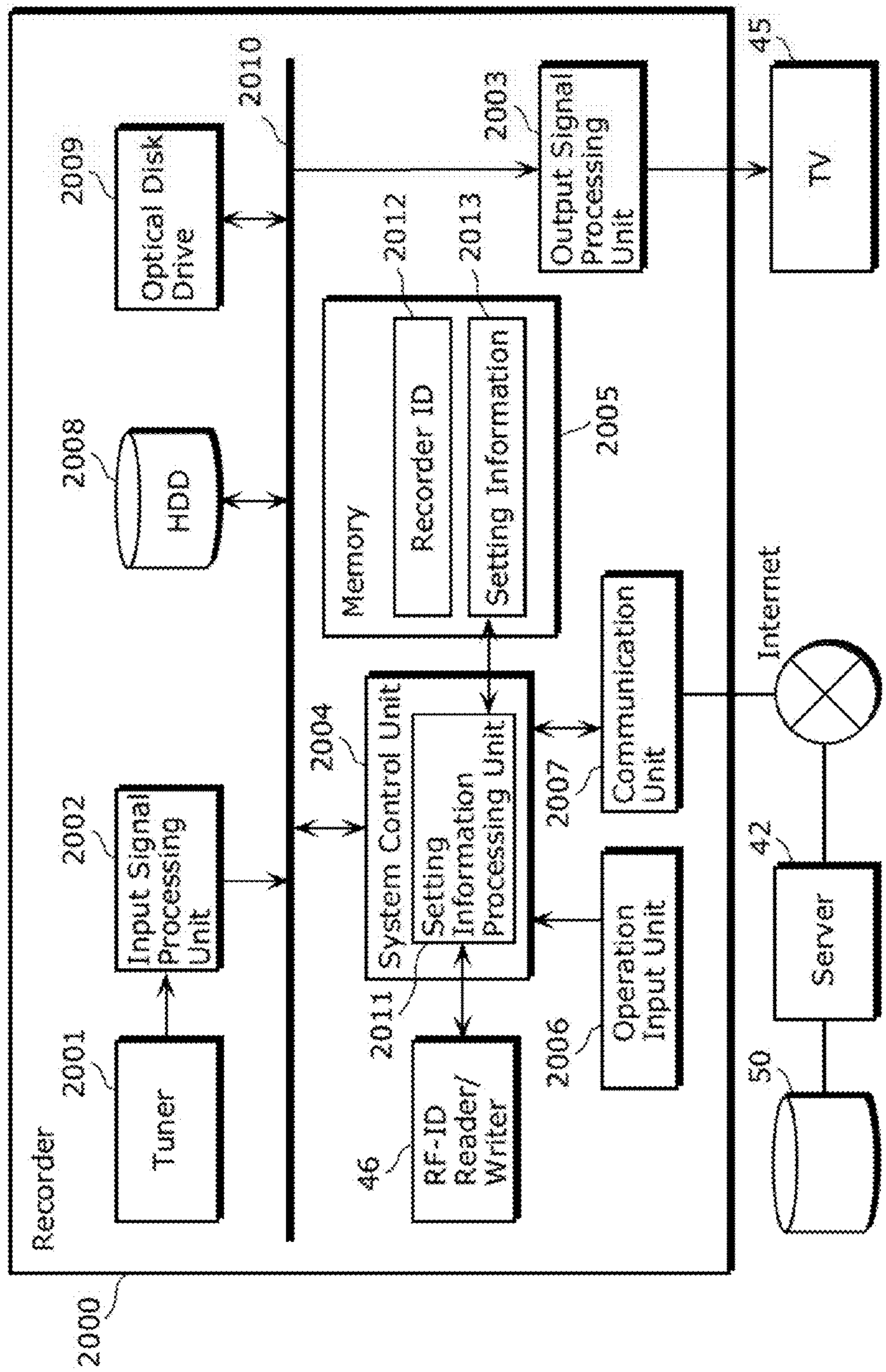
FIG. 77 is a block diagram of a recorder according to Embodiment 7 of the present invention.
Figure 78:
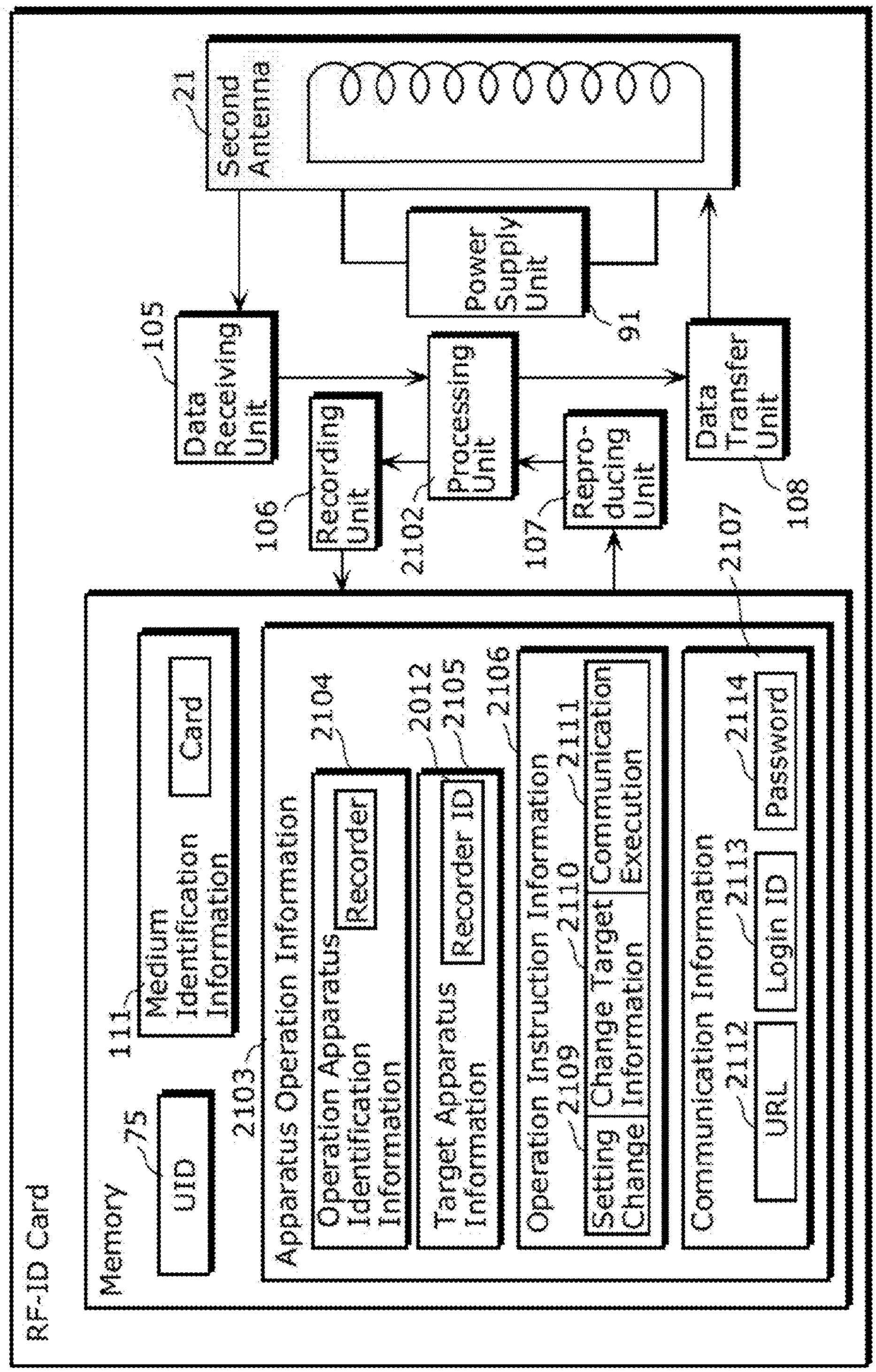
FIG. 78 is a block diagram of a RF-ID card according to Embodiment 7 of the present invention.

The following describes a method of changing setting for a recorder by using a RF-ID card with reference to FIGS. 77 and 78.

FIG. 77 is a block diagram of a structure of a recorder according to Embodiment 7.

A recorder 2000 records broadcast contents obtained by a tuner 2001, onto a Hard Disk Drive (HDD) 2008 or an optical disk drive 2009. In addition, the recorder 200 reproduces, on the TV 45, the recorded contents or video/audio contents ready by the optical disk drive 2009.

An input signal processing unit 2002 includes an Analog/Digital (A/D) converter, a decoder, and an encoder, in order to convert input video/audio signals into data in a predetermined video/audio format. The A/D converter converts analog signals obtained by the tuner 2001 into digital signals. The decoder decodes scrambled contents. The encoder converts data into data in a video format according to MPEG-2, for example.

An output signal processing unit 2003 includes a Digital/Analog (D/A) converter and a decoder in order to provide video and audio to the TV 45. The D/A converter converts digital signals to analog signals. The decoder decodes data in a data format according to MPEG-2, for example.

A system control unit 2004 controls operations of the recorder 2000. The system control unit 2004 includes a setting information processing unit 2011 that switches setting for the recorder 2000. The setting information processing unit 2011 will be described in detail later.

A memory 2005 holds recorder ID 2012 for identifying the recorder 2000, and setting information 2013 for the recorder 2000.

An operation input unit 2006 receives inputs from a user using buttons of a remote controller, a front panel, or the like (not shown).

A communication unit 2007 connects the recorder 2000 to the server 42 via the internet or a LAN.

The HDD 2008 has an area in which recorded contents and content lists provided from the input signal processing unit 2002 are stored.

The optical disk drive 2009 is a disk drive that performs recording or reproducing for an optical disk such as a Digital Versatile Disc (DVD) or a Blue-ray Disc. The optical disk drive 2009 records recorded contents and content lists provided from the input signal processing unit 2002 onto the optical disc, and reproduces video/audio contents in the optical disk.

The input signal processing unit 2002, the output signal processing unit 2003, the system control unit 2004, the HDD 2008, and the optical disk drive 2009 of the recorder 2000 are connected one another via a bus 2010.

Here, the setting information processing unit 2011 is described in more detail below.

According to the setting information 2013 stored in the memory 2005, the setting information processing unit 2011 sets displaying of a menu screen, a recording/reproducing mode, chapters of recorded contents, TV program recommendation based on user's preference, and the like regarding the recorder 2000. In more detail, the setting information processing unit 2011 reads an identifier indicating, for example, "menu screen background color: Black" from the setting information 2013, and thereby issues a request for menu screen display to the output signal processing unit 2003 together with an instruction for displaying a background of a menu screen in black.

Here, the setting information 2013 may be stored in an external storage unit such as a SD card not shown. Especially, it is efficient to store, in the HDD 2008, the setting information regarding chapters of recorded contents stored in the HDD 2008, information having a large size, and the like.

Conventionally, the setting information 2013 has been set prior to purchase of the recorder 2000, or set by operations of the user using the operation input unit 2006. In Embodiment 7 of the present invention, however, the setting information 2013 can be changed based on information obtained from the RF-ID reader/writer 46.

FIG. 78 is a block diagram of a structure of the RF-ID card from which information is read by the RF-ID reader/writer 46 of the recorder 2000 to be used to change the settings of the recorder 2000.

The RF-ID card 2100 includes a memory 2101, the antenna (second antenna) 21, the power supply unit (second power supply unit) 91, the data receiving unit 105, the data transfer unit 108, a processing unit 2102, the recording unit 106, and the reproducing unit 107.

When the RF-ID card 2100 is moved to bring the antenna 21 into proximity of the RF-ID reader/writer 46 of the recorder 2000, the RF-ID reader/writer 46 supplies power to the power supply unit 91 via the antenna 21 in order to provide power to the respective units in the RF-ID card 2100.

Information regarding data recording/reproducing is read from the RF-ID card 2100 to the recorder 2000 via the RF-ID reader/writer 46. In the recorder 2000, the information is received by the data receiving unit 105 and then provided to the processing unit 2102.

In the RF-ID card 2100, the processing unit 2102 causes the recording unit 106 to record information onto the memory 2101, and causes the reproducing unit 107 to reproduce the information stored in the memory 2101.

The data transfer unit 108 transmits the information provided from the processing unit 2102 to the RF-ID reader/writer 46 of the recorder 2000 via the antenna 21.

The memory 2101 in the RF-ID card 2100 stores the UID 75, the medium identification information 111, and apparatus operation information 2103.

The UID 75 and the medium identification information 111 are used to identify the RF-ID card 2100.

The UID 75 is identification unique to the RF-ID card 2100.

The medium identification information 111 holds an identifier indicating that the RF-ID card 2100 is a card.

The apparatus operation information 2103 holds pieces of information regarding an apparatus (device) to perform an operation using the RF-ID card 2100 and regarding the operation. The following describes the pieces of information included in the apparatus operation information 2103.

Operation apparatus identification information 2104 indicates a type of the apparatus (device) to perform the operation using the RF-ID card 2100. The operation apparatus identification information 2104 indicates the type by an identifier in the similar manner as described for the medium identification information 111. In FIG. 78, the operation apparatus identification information 2104 holds an identifier indicating that a type of the apparatus to perform the operation is a recorder.

Target apparatus information 2105 holds information so that only a specific apparatus (device) can perform the operation using the RF-ID card 2100. In the example of FIG. 78, the target apparatus information 2105 holds recorder ID 2012 for identifying the recorder 2000. It should be noted that, if an apparatus that can use the RF-ID card 2100 according to Embodiment 7 of the present invention is limited, for instance, if only recorders can use the RF-ID card 2100, the operation apparatus identification information 2104 and the target apparatus information 2105 may not be included in the apparatus operation information 2103. In addition, if the setting information processing unit 2011 in the recorder 2000 has a structure to change settings of the recorder 2000 by using the information in cards, the medium identification information 111 may not be included in the memory 2101.

Operation instruction information 2106 indicates details of the operation to be performed by the apparatus designated in the apparatus operation information 2103. In the example of FIG. 78, the operation instruction information 2106 includes information 2109 indicating that setting is to be changed (setting change), information 2110 indicating a target for which the setting change is to be performed (change target information), and information 2111 indicating that communication is to be executed in obtaining the setting information (communication execution).

It should be noted that the operation instruction information 2106 is not limited for a single operation, but may include plural pieces of information for plural operations, or may be a program in which the plural operations are combined.

Communication information 2107 is information regarding a server or the like. When the recorder 2000 is instructed based on the operation instruction information 2106 to access the server or the like to obtain data, the recorder 2000 accesses the server or the like using the communication information 2107. In the example of FIG. 78, the communication information 2107 includes a URL 2112, login ID 2113, and a password 2114 of the server or the like. The URL 2112 may be replaced by an IP address. If the recorder 2000 is to access a different apparatus (device) via an office or home network, the URL 2112 may be information for identifying the apparatus, such as a MAC address.

Figure 79:
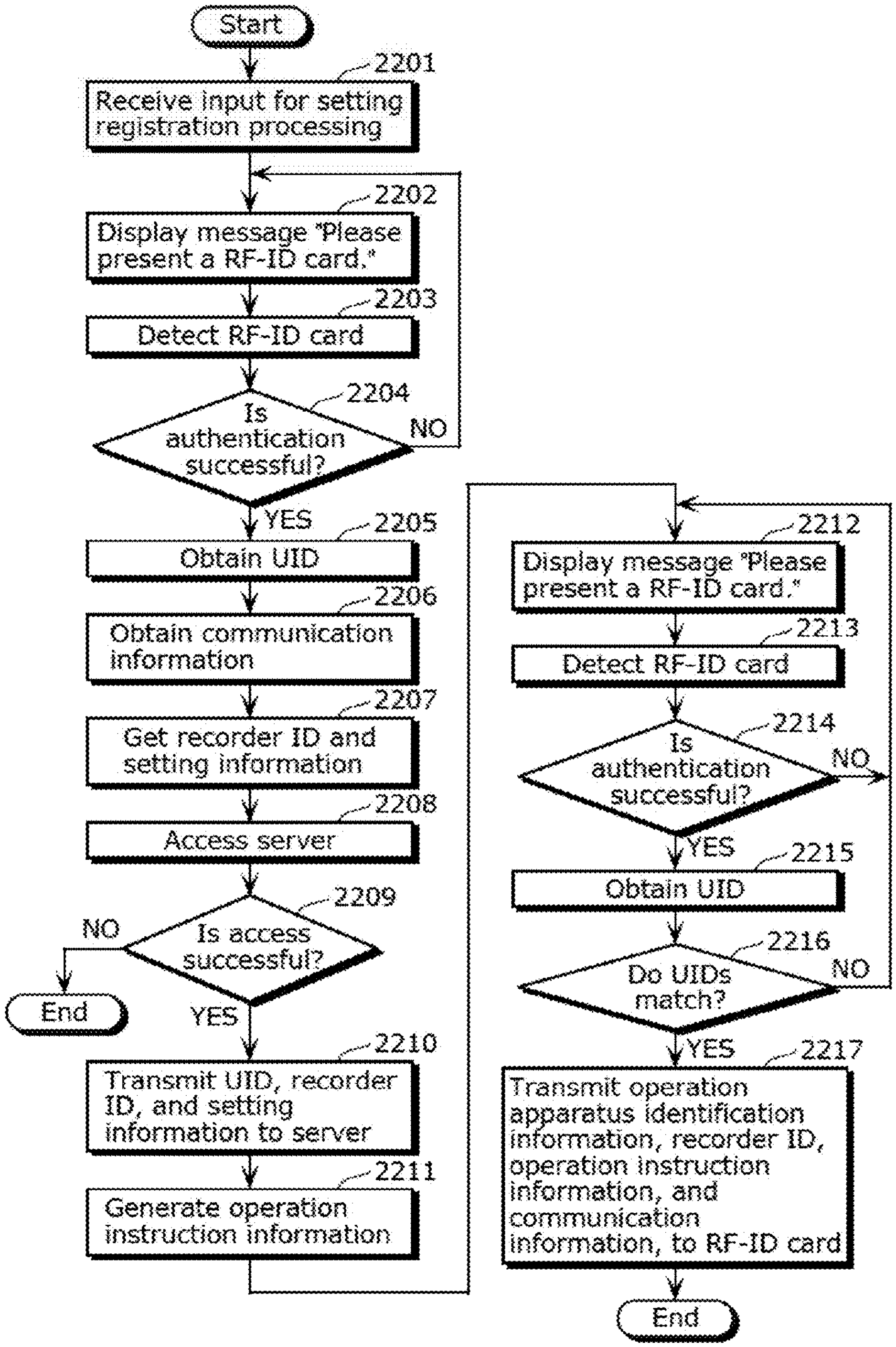
FIG. 79 is a flowchart of steps of registering setting information to a server.

The following describes processing by which the recorder 2000 registers the setting information from the recorder 2000 to a server by using the RF-ID card 2100 with reference to FIG. 79.

In Step 2201, when the recorder 2000 receives an input from the user using the operation input unit 2006, the setting information processing unit 2011 causes the output signal processing unit 2003 to issue, to the TV 45, a request for message display. In response to the request, the TV 45 displays a message "Please present a RF-ID card" on its screen in Step 2202. The message may be displayed on a console (not shown) of the recorder 2000. It is also possible that the recorder 2000 requests the user for authentication such as a password or biometric authentication when the user performs the input operation, and after the authentication, proceeds to the setting registration processing. It is further possible that the recorder 2000 does not request the TV 45 for the message display, but the user needs to present the RF-ID card 2100 to the RF-ID reader/writer 46 when using the recorder 2000 in order to perform steps of and after 2203. It is still further possible that an enquiry message is displayed to enquire where the setting information 2013 is to be registered, and the setting information 2013 is registered into the location the user designates. For example, the setting information 2013 may be registered into the RF-ID card 2200, or into a sever different from the server 42.

In Step 2203, the recorder 2000 detects the RF-ID card. After that, mutual authentication between the recorder 2000 and the RF-ID card 2100 is performed in Step 2204.

If the mutual authentication in Step 2204 is successful, then the processing proceeds to Step 2205. Otherwise, the processing returns to Step 2202 to repeat the detection of the RF-ID card.

In Step 2205, the recorder 2000 obtains the UID 75 from the memory 2101 in the RF-ID card 2100.

In Step 2206, the recorder 2000 obtains the communication information 2107 from the memory 2101 in the RF-ID card 2100. If the memory 2101 in the RF-ID card 2100 does not hold the communication information, the recorder 2000 may issue, to the user, a request for providing the communication information. Moreover, if the user instructs in Step 2201 the recorder 2000 to register the setting information 2013 into a location that is not designated in the RF-ID card 2100, Step 2206 is not performed. If plural pieces of the communication information 2107 are stored in the RF-ID card 2100, it is possible to display a list of the plural pieces of the communication information 2107 from which the user can select a desired one.

In Step 2207, the recorder 2000 gets the recorder ID 2012 and the setting information 2013 from the memory 2005. The setting information 2013 is not limited to information currently stored, but may be information inputted by the user in the setting registration processing.

In Step 2208, in the recorder 2000, the setting information processing unit 2011 issues, to the communication unit 2007, a request for access to a server or the like having the URL 2112 included in the obtained communication information 2107. The communication unit 2007 accesses the server using the login ID 2113 and the password 2114.

In Step 2209, it is determined whether or not the access to the server 42 is successful. If the access is successful, then the processing proceeds to Step 2210. Otherwise, the setting registration processing is terminated.

In Step 2210, the recorder 2000 transmits, to the server 42, the UID 75, and the recorder ID 2012 and the setting information 2013 which are obtained from the memory 2005, thereby registering the setting information 2013 into the server 42.

In Step 2211, the recorder 2000 generates the operation instruction information 2106, using (a) the operation designated in Step 2201 or a storage location of the setting information 2013 selected in Step 2201, (b) the setting information 2013 obtained in Step 2207, and (c) the communication information 2107 obtained in Step 2206.

In Step 2212, the recorder 2000 performs the same step as Step 2202 to cause the TV 45 to displays a message "Please present a RF-ID card" on its screen.

In Step 2213, the recorder 2000 detects the RF-ID card. After that, mutual authentication between the recorder 2000 and the RF-ID card 2100 is performed in Step 2214.

If the mutual authentication in Step 2214 is successful, then the processing proceeds to Step 2215. Otherwise, the processing returns to Step 2212 to repeat the detection of the RF-ID card 2100.

In Step 2215, the recorder 2000 obtains the UID from the memory 2101 in the RF-ID card 2100.

In Step 2216, it is determined whether or not the UID 75 obtained in Step 2205 matches the UID obtained in Step 2215. If the UIDs match, then the processing proceeds to Step 2217.

Otherwise, the processing returns to Step 2211 to repeat the detection of the RF-ID card 2100.

In Step 2217, the recorder 2000 transmits, to the RF-ID card 2100, the operation apparatus identification information 2104 (not shown in FIG. 77) stored in the memory 2005, the recorder ID 2012, the operation instruction information 2106 generated in Step 2211, and the communication information 2107, in order to record (register) these pieces of information onto the memory 2101 of the RF-ID card 2100. As a result, the setting registration processing is completed.

Referring to FIG. 80, the setting information registered into the server 42 by the above-described processing of FIG. 79 is described.

Each of the setting information registered in the server 42 is hereinafter referred to as setting information 2250. Each setting information 2250 is registered in association with a corresponding one of the UID 75 and a corresponding one of the target apparatus information 2105. In more detail, the setting information 2250 holds an identifier indicating, for example, "menu screen background color: Black". In the example of FIG. 80, a letter "A" or "B" at the end of pieces of the setting information 2250 indicates that the setting is different from another.

It is also possible that plural pieces of setting information are registered for a single UID such as UID0001 in FIG. 80. It is further possible that a single piece of the target apparatus information 2105, such as REC-0001, is registered for plural pieces of setting information associated with different UID. Here, the setting information may include the change target information 2110.

Next, referring to FIG. 81, the apparatus operation information 2103 registered in the memory 2101 of the RF-ID card 2100 by the above-described processing of FIG. 79 is described.

It is assumed in the example of FIG. 81 that the UID 75 designates "UID0001" and the medium identification information 111 designates a "card".

The apparatus operation information 2103 includes sets each including the operation apparatus identification information 2104, the target apparatus information 2105, the operation instruction information 2106, and the communication information 2107. Here, it is possible that the communication information 2107 is not registered as being information not related to the other pieces of information. For instance, it is possible that only a piece of the communication information 2107 is registered to always access the same server in using the RF-ID card 2100.

The operation instruction information 2106 includes instruction detail information 2260, instruction target information 2261, and communication execution information 2262. The instruction detail information 2260 holds an identifier indicating an operation to be performed by the device designated by the target apparatus information 2105. The instruction target information 2261 holds an identifier indicating a setting, such as a menu screen mode or recording mode, of the apparatus to perform the operation, such as REC-0001. The communication execution information 2262 holds an identifier indicating whether or not communication is to be executed in performing the operation indicated in the instruction detail information 2260. It should be noted that the apparatus operation information 2103 may include only the communication information 2107 if the operating to be performed using the RF-ID card 2100 is limited to changing of setting.

The communication information 2107 holds a URL, login ID, a password, and the like for accessing a server that is a partner of communication, if the communication execution information 2262 indicates that the communication is to be executed.

Figure 82:
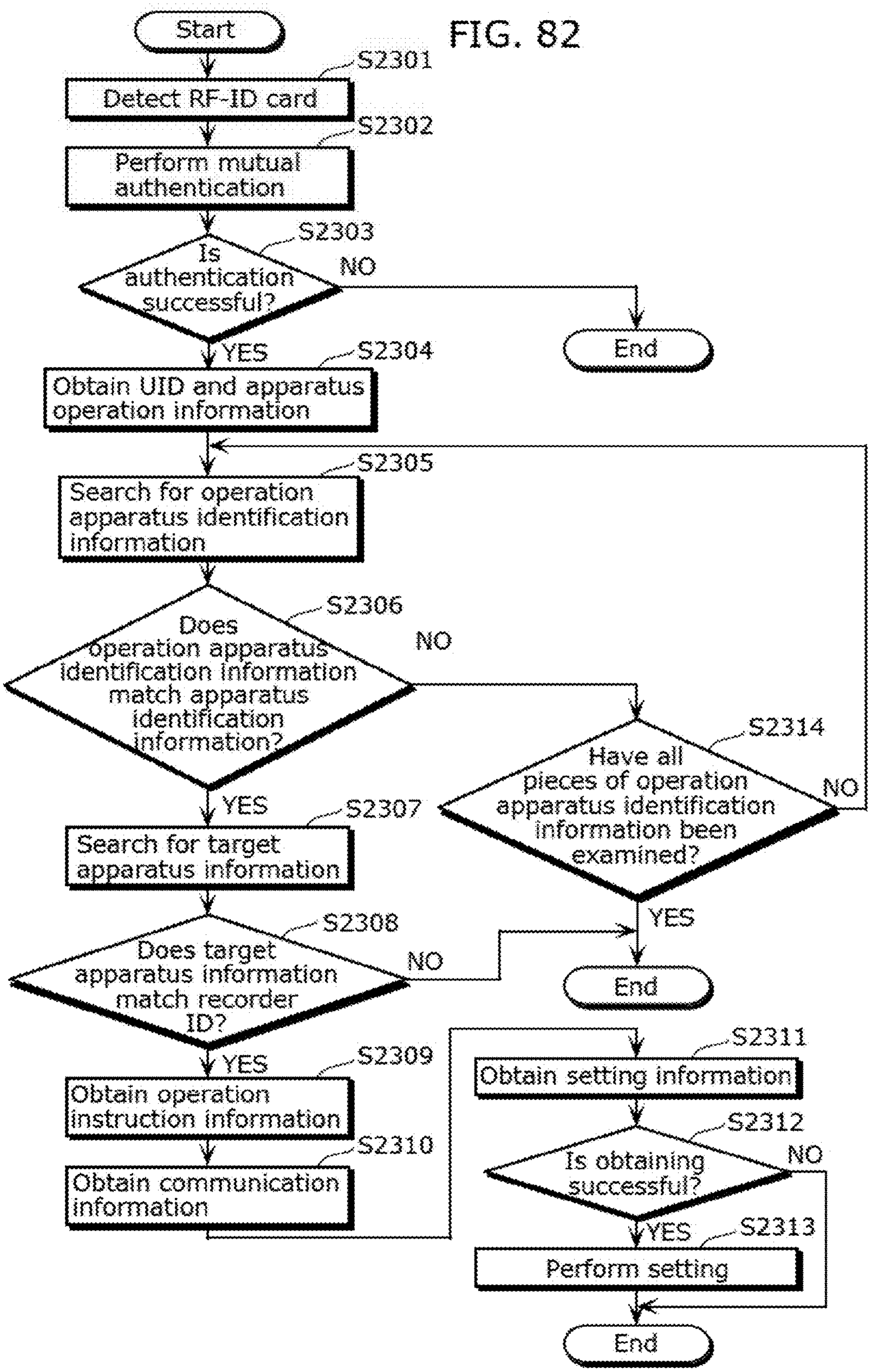
FIG. 82 is a flowchart of steps of updating setting information of a recorder by the RF-ID card.

Next, the description is given for processing of changing the setting of the recorder 2000 by using the RF-ID card 2100 with reference to FIG. 82. FIG. 82 is a flowchart of processing by which the setting information processing unit 2011 in the recorder 2000 updates the setting information 2013 by using the RF-ID card 2100.

First, in Step 2301, the recorder 2000 detects the RF-ID card 2100. After that, in Step 2302, the recorder 2000 performs mutual authentication with the RF-ID card 2100.

In Step 2303, the recorder 2000 determines whether or not the mutual authentication is successful. If the mutual authentication is successful, then the processing proceeds to Step 2304. Otherwise, the setting update processing is terminated.

In Step 2304, the recorder 2000 obtains the UID 75 and the apparatus operation information 2103 from the memory 2101 of the RF-ID card 2100.

In Step 2305, the recorder 2000 searches the apparatus operation information 2103 for the operation apparatus identification information 2104. In Step 2306, the recorder 2000 compares the searched-out operation apparatus identification information 2104 to apparatus identification information (not shown) in the memory 2005 of the recorder 2000.

If it is determined in Step 2306 that the operation device identification information 2104 matches the device identification information, then the processing proceeds to Step 2307. Otherwise, the processing proceeds to Step 2314.

In Step 2314, the recorder 2000 determines whether or not all pieces of the operation apparatus identification information 2104 in the apparatus operation information 2103 have been examined. If all pieces of the operation apparatus identification information 2104 have been examined, then the setting update processing is terminated.

In Step 2307, the recorder 2000 searches the device operation information 2103 for the target apparatus information 2105. In Step 2308, the recorder 2000 compares the searched-out target apparatus information 2105 to the recorder ID 2012 in the memory 2005 of the recorder 2000.

If it is determined in Step 2308 that the target device information 2105 matches the recorder ID 2012, then the processing proceeds to Step 2309. Otherwise, the setting update processing is terminated.

In Step 2309, the recorder 2000 obtains the operation instruction information 2106 associated with the target device information 2105 from the apparatus operation information 2103.

In Step 2310, the recorder 2000 obtains the operation instruction information 2107 associated with the target apparatus information 2105 from the apparatus operation information 2103.

In Step 2311, the recorder 2000 determines, based on the instruction detail information 2260 in the operation instruction information 2106 in the device operation information 2103, that an operation to be performed is updating of setting, and thereby accesses the server 42 to obtain the setting information 2250 from the server 42. The step will be described in more detail with reference to FIG. 83.

In Step 2312, the recorder 2000 determines whether or not the obtainment of the setting information 2250 is successful. If the obtainment of the setting information 2250 is successful, then the processing proceeds to Step 2313. In Step 2313, the setting information processing unit 2011 in the recorder 2000 updates the setting information 2013 in the memory 2005 of the recorder 2000 by the setting information 2250. On the other hand, if the obtainment of the setting information 2250 fails, then the setting update processing is terminated.

Figure 83:
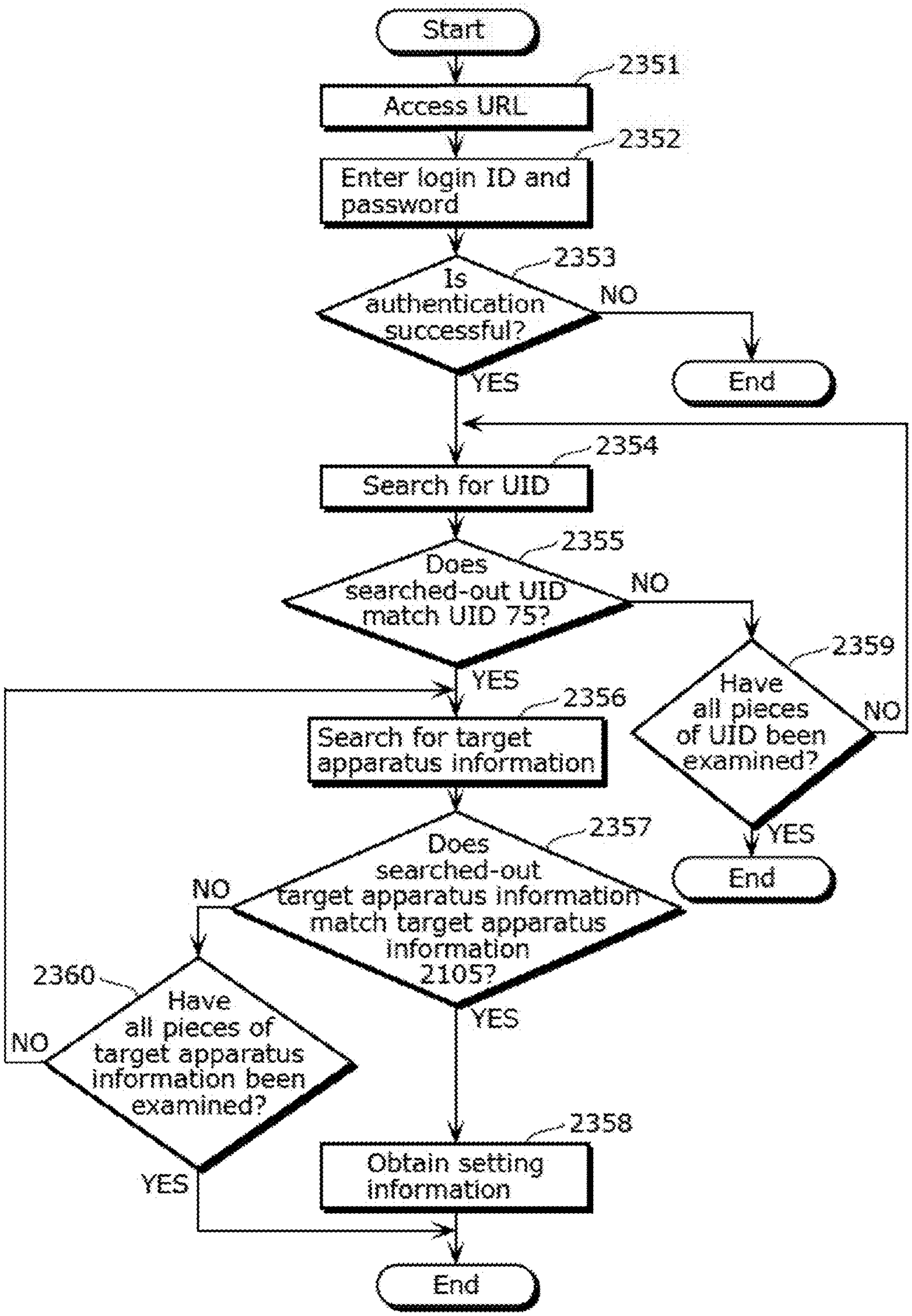
FIG. 83 is a flowchart of steps of obtaining the setting information from the server.

The following describes Step 2311 in FIG. 82 in more detail with reference to FIG. 83. FIG. 82 is a flowchart of processing by which the setting information processing unit 2011 in the recorder 2000 accesses the server 42 to obtain the setting information 2250 from the server 42.

In Step 2351, the communication unit 2007 in the recorder 2000 accesses the server 42 having the URL 2112 included in the communication information 2107.

In Step 2352, the setting information processing unit 2011 provides the communication unit 2007 with the login ID 2113 and the password 2114 which are included in the communication information 2107, and thereby the communication unit 2007 logins to the server 42.

In Step 2353, it is determined whether or not authentication (namely, the login) is successful. If the authentication is successful, then the processing proceeds to Step 2354. Otherwise, the processing is terminated as being failure of obtaining the setting information 2250.

In Step 2354, the recorder 2000 searches the server 42 for UID. In Step 2355, the recorder 2000 determines whether or not the searched-out UID matches the UID 75 obtained in Step 2304 in FIG. 82. If the searched-out UID matches the UID 75, then the processing proceeds to Step 2356. Otherwise, the processing returns to Step 2354 to repeat the search for UID until it is determined in Step 2359 that all pieces of UID in the server 42 have been examined. If it is determined in Step 2359 that all pieces of UID in the server 42 have been examined, then the processing is terminated as being failure of obtaining the setting information 2250.

In Step 2356, the recorder 2000 searches the server 42 for the target apparatus information associated with the UID 75. In Step 2357, the recorder 2000 determines whether or not the searched-out target apparatus information matches the target apparatus information 2105 obtained in Step 2305 in FIG. 82. If the searched-out target apparatus information matches the target apparatus information 2105, then the processing proceeds to Step 2358. On the other hand, if the searched-out target apparatus information does not match the target apparatus information 2105, then the processing proceeds to Step 2358, then the processing returns to Step 2354 to repeat the search for the target apparatus information until it is determined in Step 2360 that all pieces of the target apparatus information in the server 42 have been examined. If it is determined in Step 2360 that all pieces of the target apparatus information have been examined, then the processing is terminated as being failure of obtaining the setting information 2250.

In Step 2258, the recorder 2000 obtains, from the server 42, the setting information 2250 associated with the UID 75 and the target apparatus information 2105.

As described above, the use of the RF-ID card 2100 enables the user to perform setting of the recorder 2000 without complicated operations. Even if the user is not familiar with operations of apparatuses (devices) the user can easily change the setting of the recorder 2000 by using the RF-ID card 2100. Moreover, the operation executable for the recorder 2000 by using the RF-ID card 2100 is not limited to the setting change. For example, the instruction detail information can designate an operation of obtaining a list of recorded contents in the recorder. In this case, the list is registered in the RF-ID card or the server. Thereby, the user can check the list on a different apparatus (device) other than the recorder by using the RF-ID card.

In addition, the RF-ID card holding information illustrated in the FIG. 84 allows the user to perform timer recording in the recorder simply by presenting the RF-ID card to the recorder. In more detail, if the change target information associated with Index 1 in FIG. 84 is applied, the recorder can perform timer recording according to setting of "TV program ID" and "recording mode" designated in the instruction target information, simply by presenting the RF-ID card to the recorder. Thereby, the timer recording can be performed without accessing the server. In addition, if the change target information associated with Index 2 in FIG. 84 is applied, the recorder can perform timer recording according to "TV program code" designated in the instruction target information, simply by presenting the RF-ID card to the recorder. Here, the recorder can obtain, from the server, (a) program ID or a start time and end time, and (b) channel information. As a result, the time recording can be performed according to the setting of the "recording mode".

Furthermore, it is also possible that "recommended TV program" is designated in the instruction target information in the RF-ID card. After presenting the RF-ID card to the recorder, the recorder obtains ID of the recommended TV program from the server. Thereby, the recorder can obtain a content of the recommended TV program from the server and performs timer recording of the content. The above functions may be used as service for providing the RF-ID card as being a supplement of a TV program guide magazine, for example. This RF-ID card can reduce user's bothersome procedures for timer recording. For another service, it is also possible in the RF-ID card that the instruction detail information designates a download operation, the instruction target information designates video or software in a version where a function is restricted, and the communication information designates a URL of a download website. Such RF-ID cards are provided for free to users. The users can use the video or software as trial, and purchase it if the user likes it.

It should be noted that the description in Embodiment 7 has been given for the recorder, but the present invention is not limited to the recorder.

For example, Embodiment 7 of the present invention may be implemented as a TV having a reader/writer for the RF-ID card and the setting information processing unit. The TV can register, as the change target information, (a) setting of an initial display channel or initial sound volume immediately after power-on, (b) setting of child lock for excluding adult broadcasts and violence scenes, (c) setting of zapping for favorite channels, (d) setting of contrast and brightness of a screen, (e) setting of a language, (f) setting of a continuous use time, and the like, simply by presenting the RF-ID card to the TV. Thereby, the TV can perform settings according to usability. Furthermore, Embodiment 7 may be implemented also as a vehicle navigation system having a reader/writer for the RF-ID card and the setting information processing unit. In this aspect, the instruction detail information designates "highlighted display" and the instruction target information designates "landmark information". Thereby, by using the RF-ID card, the vehicle navigation system can display the designated landmark as being highlighted, by changing a character font, character size, or color. The landmark information may be obtained from a server. In this case, the RF-ID cards, on which the apparatus operation information illustrated in FIG. 85 is recorded, are offered to users at rest areas or interchanges on expressways, sightseeing spots, and the like. Thereby, the RF-ID cards allow vehicle navigation systems of the users to display a recommended landmark, where an event is currently held for example, as highlighted display. In addition, Embodiment 7 may be implemented as a laptop having a reader/writer for the RF-ID card and the setting information processing unit. The laptop can designate (a) setting of a resolution of a screen, (b) setting of a position of an icon or the like on a display, (c) setting of a wallpaper, (d) setting of a screen saver, (e) setting of start-up of resident software, (f) setting of employed peripheral devices, (g) setting of a dominant hand for a mouse or the like, and the like, by simply by presenting the RF-ID card to the laptop. Therefore, if the user brings the RF-ID card in a business trip, the user can operate a different personal computer at the business trip location, with the same settings as those the user usually uses. Embodiment 7 may be implemented further as a game machine having a reader/writer for the RF-ID card and the setting information processing unit. The user visiting a friend's house uses a RF-ID card in which the instruction detail information designates setting change. By presenting the RF-ID card to the game machine at the friend's house, the user can change (a) setting of positions of keys on a remote controller and (b) setting of a structure of a menu screen. In addition, the user can save data in the game machine by using the RF-ID card. Moreover, the following service using the RF-ID card is also possible. The RF-ID card holds the instruction detail information designating a download operation. Such RF-ID cards are offered to users as supplements of magazines or the like. The users can use the RF-ID cards to download an additional scenario, a rare item, or the like.

The RF-ID card according to Embodiment 7 of the present invention can be also applied to home appliances connected to one another via a network. In this aspect, the RF-ID card previously holds (a) setting of a temperature of an air conditioner, (b) setting for a temperature of hot water in a bus tab, and the like, depending of the user's preference. Thereby, the user presents the RF-ID card to RF-ID reader/writers in the user's house so as to manage settings of the home appliances at once. In addition, the RF-ID card may designate an operation for checking foods stored in a refrigerator. Here, information of the foods which is registered in the refrigerator is obtained by using RF-ID tags previously attached to the foods. Or, video of the inside of the refrigerator is captured by using camcorder. Thereby, the user can check a list of the foods on a TV by using a RF-ID reader/writer to obtain information from the RF-ID card. As described above, the RF-ID card according to Embodiment 7 of the present invention can be applied for various usages. It is also possible to combine (a) RF-ID cards for designating apparatuses (such as four different cards indicating "heating appliance", "cooling appliance", "stove", and "fan", respectively) and (b) RF-ID cards for designating setting of the apparatuses (such as three different cards indicating "weak", "medium", and "strong", respectively). It is further possible that such RF-ID cards having the apparatus-designating and setting-designating functions are integrated into a single RF-ID card. And, the settings of the apparatuses can be customized.

Although only some exemplary embodiments of the present invention have been described in detail above, those skilled in the art will be readily appreciate that many modifications are possible in the exemplary embodiments without materially departing from the novel teachings and advantages of the present invention. Accordingly, all such modifications are intended to be included within the scope of the present invention.

For example, if two users (hereinafter, referred to as a user A and a user B) exchanges photographs between them, the user B can view photographs taken by the user A by the following method. The user B has a TV having an apparatus ID and a relay server having a URL. The apparatus ID and the URL are previously stored in a RF-ID (hereinafter, referred to as a RF tag B). The user B generates information (hereinafter, referred to as device generation information B) from the information in the RF tag B and stores the generated device generation information B into the RF tag B. The user B transmits the device generation information B to the user A via e-mail or the like. The user A stores a URL of a server holding the photographs into the relay server, in association with the received device generation information B. Thereby, the user B simply presents the RF tab B to a RF-ID reader/writer of the TV in order to view the photographs taken by the user A. Here, it is assumed that the RF tag B previously holds an e-mail address of the user A. When the user B simply presents the RF tag B to the RF-ID reader/writer of the TV, the device generation information B may be automatically written into the TV and a notification of the device generation information B may be automatically transmitted to the e-mail address of the user A. Thereby, even if the user B is not familiar with operations of the devices, the user B can exchange photographs with the user A. Furthermore, it is also possible that the user A encrypts at least one of a URL, login ID, and a password by using the device generation information B and sends, to the user B, a post card with RF-ID on which the encrypted information is recorded. This makes it possible to restrict an apparatus permitted to display the photographs, only to the TV of the user B. It is further possible that the user A sends, to the user B, a post card with two RF-IDs that are a RF-ID for sending and a RF-ID for returning. In this aspect, the user A records, onto the RF-ID for returning, device generation information A that is previously generated by a TV or the like of the user A. This can restrict an apparatus permitted to display photographs stored by the user B. More specifically, when the user B receives the post card with the two RF-IDs and returns the post card to the user A, the user B encrypts, by using the device generation information A, a URL, a login ID, or a password of a server storing the photographs of the user B, and then records the encrypted data onto the RF-ID for returning. Or, when the user B stores the photographs, the user B associates the photographs with the device generation information A. Therefore, an apparatus permitted to display photographs stored by the user B can be restricted.

Moreover, the mailing object UID of the RF-ID on the mailing object may be a combination of (a) a group ID that is common among a plurality of mailing objects and (b) a UID unique that is unique to each mailing object. Thereby, image data in the server is associated not with every mailing object UID but with the group ID. Therefore, when post cards with RF-ID on which the image data is associated with a plurality of targets are mailed, it is possible to eliminate user's bothersome procedures for performing registration for each of the UIDs. It is also possible that the image data stored in the server in association with the group ID is switched to be permitted or inhibited to be viewed for each of the UID. Thereby, if, for example, a printer prints destination addresses on the mailing objects, the printer having a RF-ID reader/writer reads the UIDs on the mailing objects and thereby associates the UIDs with addresses in an address list, respectively. Thereby, the address list can be used to manage the permission/inhibition of viewing the images stored in the server.

It is also possible that a post card or card is provided with a plurality of RF-ID tags having various different functions. In this aspect, the single post card or card can switch the functions by disconnecting communication of a part of the RF-ID tags which are not currently used. For example, a post card has (a) an upper portion on which a RF-ID tag having a function of displaying a slide show of photographs is attached and (b) a lower portion on which a RF-ID tag having a function of reproducing video. A user can switch the display function or the reproduction function, by selecting the upper portion or the lower portion to be brought into proximity of a RF-ID reader/writer. The RF-ID tags having different functions can be provided to a front side and a back side of the post card. It is also possible that covers made of a material blocking communications are applied on the RF-ID tags so that the user can select a RF-ID tag to be used by opening the cover on it.

It is further possible that photographs are stored in a plurality of servers, and a RF-ID tag holds URLs of the servers. Thereby, a user can access the servers to obtain the photographs to display them in a list.

Moreover, the RF-ID reader/writer may be provided not only to an apparatus (device) such as the TV or the recorder but also to the input means such as a remote controller for operating the apparatus. For instance, if a plurality of apparatuses are connected to one another via a network, an input means for collectively operating the apparatuses may be provided with a RF-ID reader/writer to operate the respective apparatuses. Furthermore, an input means such as a remote controller may be provided with an individual authentication means for biometric authentication such as fingerprint authentication or face authentication, password, or the like. In this aspect, the input means having a RF-ID reader/writer exchanges data with a RF-ID tag, only when the individual authentication is successful. It is also possible that the individual authentication information is previously stored in the RF-ID tag, and individual authentication is performed by the apparatus or the remote controller using the RF-ID tag.

It should be noted that the definition of the term "RF-ID" frequently used in the description of the present invention is not limited to narrow meaning. In general, the term "RF-ID" narrowly refers to a "tag having a nonvolatile memory on which identification information is recorded". RF-ID having a dual interface function or a security function seems commonly called as a "IC card" or the like. However, in the embodiments of the present invention, the "RF-ID" widely refers to an "electronic circuit which has a nonvolatile memory on which individual identification information is recorded and which can transmit the individual identification information to the outside via an antenna".

Conventionally, if a user who is not familiar with operations of an apparatus (device) wishes to perform complicated settings for the apparatus, it is necessary that a seller, repairer, or serviceperson of the apparatus visits a location of the apparatus to perform the settings or controls the apparatus remotely. Even in remotely controlling the apparatus, the seller, repairer, or serviceperson has to visit the location for setting of the remote control. In Embodiment 7 of the present invention, however, the RF-ID card 2100 enables the user to perform the settings of the apparatus (the recorder 2000) without complicated operations. Therefore, even the user not familiar with operations of the recorder can easily change the settings of the recorder.

The present invention can be implemented also as an image presentation method of presenting image related to a communication device on an apparatus (device) having a display screen, in a communication system having (a) the apparatus having the display screen, (b) a reader device connected to the apparatus via a communication path, and (c) the communication device performing proximity wireless communication with the reader device. The present invention can be implemented further as a program stored in the communication device with identification information of the communication device, the program being described by codes executed by a virtual machine included in a device performing proximity wireless communication with the communication device, and being for executing: accessing a server connected via a communication network; downloading, form the server, image associated with the identification information from among image stored in the accessed server; and displaying the downloaded image. In addition, the present invention can be implemented as a computer-readable recording medium such as a CD-ROM on which the above program is recorded.

The communication device according to the present invention may be used, of course, as various devices having a RF-ID unit in which identification information and a virtual machine program are stored. For example, the communication device may be electronic devices such as a camera, home appliances such as a rice cooker and a refrigerator, and daily commodities such as a toothbrush.

Here, an embodiment in which a RF-ID reader is provided to a remote controller of a TV or the like is described with reference to diagrams (a) and (b) in FIG. 86, a flowchart (c) in FIG. 86, and a flowchart of FIG. 87.

First, as described earlier, a child device (or child communicator) 5050 such as a camera has the memory (second memory) 52 and the antenna (second antenna) 21. When an antenna 5063 of a remote controller 5051 is moved into proximity of the antenna 21, the antenna 5063 supplies power to the antenna 21. Thereby, data in the memory 52 is transmitted from the antenna 21 to the antenna 5063. The remote controller 5051 converts the received data into digital data by a communication circuit 5064, and then stores the digital data into a memory 5061 (Step 5001_a_ in FIG. 87). Then, a transmission unit of the remote controller 5051 is faced to the TV 45 and a transmission switch 6065 on the remote controller 5051 is pressed (Step 5001_b_). Thereby, the data in the memory 5061 is transmitted as light to a light receiving unit 5058 of the parent device (apparatus) 45 (the TV 45) via a light emitting unit 5062 (Step 5001_c_). The communication may be not light but wireless.

Figure 86:
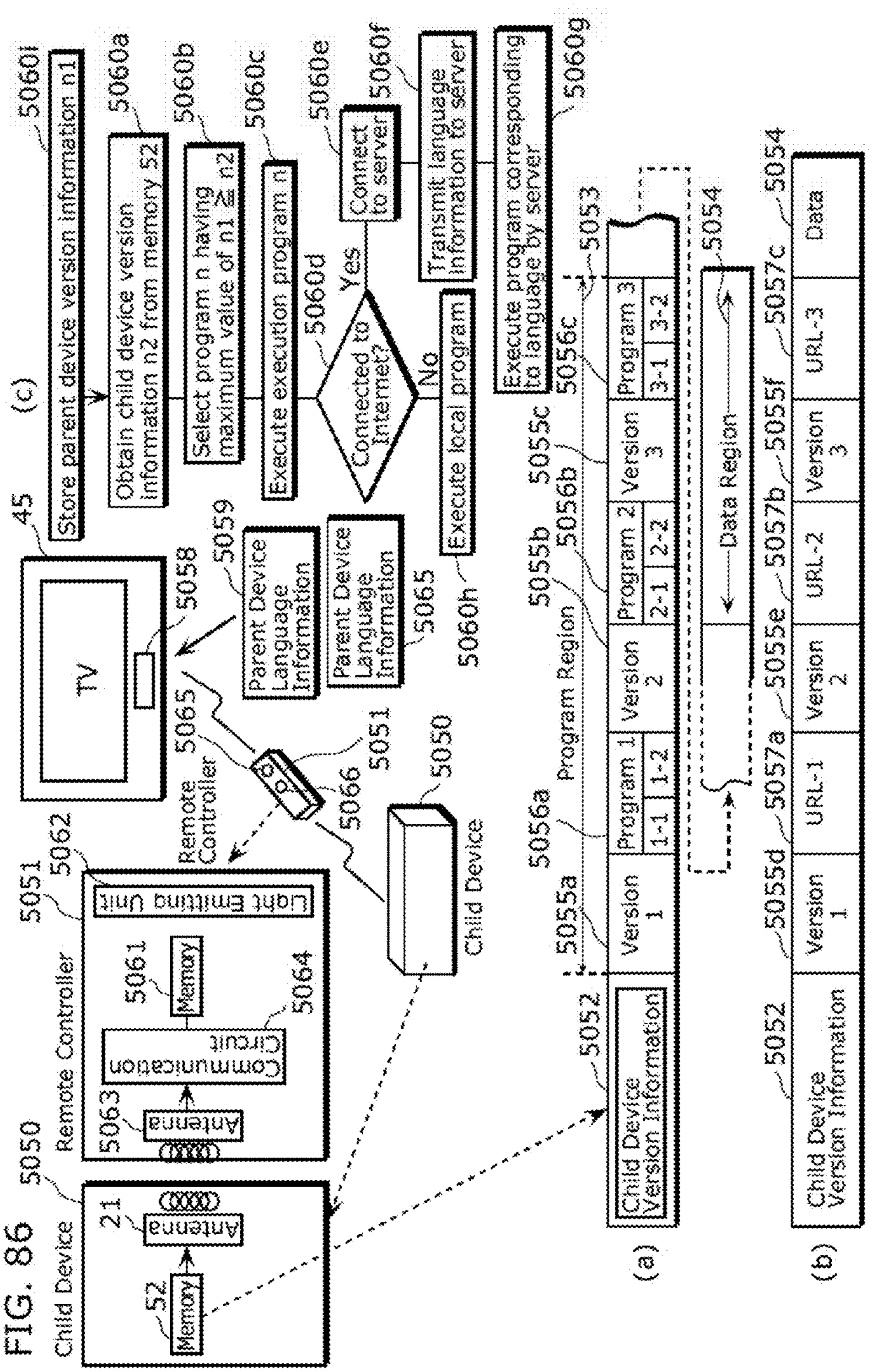
FIG. 86 is a block diagram of a configuration where a remote controller of a TV or the like has a RF-ID reader, according to Embodiment 7 of the present invention.

Referring back to a flowchart (c) in FIG. 86, the embodiment of the present invention used in social systems should be applicable even in twenty or thirty years. An example of the program described in a virtual machine language or the like is known Java™. However, such programs are expected to be extended or replaced by totally different programs described in more efficient languages. In order to address the above situation, in the embodiment of the present invention, the parent device 45 such as the TV holds parent device version information 5059 (or parent device version information $n_1$) that indicates a language type or version of a virtual machine language or the like (Step 5060_i_ in (c) of FIG. 86). In the beginning of the memory 52 of the child device 5050, child device version information 5052 (or child device version information $n_2$) indicating a version of a program language or the like for the child device is recorded ((a) in FIG. 86). Following to the child device version information 5052, a program region 5053 is recorded in the memory 52. The program region 5053 stores a program 5056_a_ in a version 5055_a_, a program 5056_b_ in a version 5055_b_, and a program 5056_c_ in a version 5055_c_. Following to the program region 5053, a data region 5054 is recorded in the memory 52.

In Step 5060_i_ in the flowchart of FIG. 86, the parent device 45 stores the parent device version information $n_1$ of the parent device 45 is stored. Then, the parent device 45 obtains the child device version information $n_2$ from the memory of the child device (Step 5060_a_). Then, the parent device 45 selects an execution program n having a maximum value of $n_1 \geq n_2$ (Step 5060_b_). The parent device 45 executes the selected execution program (Step 5060_c_). Then, it is determined whether or not the parent device 45 is connected to the Internet (Step 5060_d_). If the parent device 45 is connected to the Internet, then the parent device 45 is connected to the server via the Internet (Step 5060_e_). The parent device 45 thereby transmits language information 5065, which is set in the parent device 45, to the server (Step 5060_f_). The server provides the parent device 45 with a program in the language indicated in the transmitted language information 5065, for example in French, and causes the parent device 45 to execute the program. Alternatively, the server may execute the program on the server itself.

On the other hand, if it is determined in Step 5060_d_ that the parent device 45 is not connected to the Internet, then the processing proceeds to Step 5060_h_. In Step 5060_h_, the parent device 45 executes a local program in order to display, on a screen of the parent device 45, attribute information of the child device 5050. The attribute information is, for example, information for notifying a trouble or information regarding the number of stored photographs. As described above, the memory 52 in the child device 5050 holds the child device version information 5052. The memory 52 stores a program, procedure, URL, or the like of each generation. The program, procedure, URL, or the like will be developed every 10 years. Such data format on which information is recorded for each generation can be kept being used even in twenty or thirty years in order to operate the parent device 45. (a) of FIG. 86 illustrates an example of information on which versions or generations of a program are recorded. However, the same advantages are also offered in another example illustrated in (b) of FIG. 86. In (b) of FIG. 86, addresses of data stored in the server are recorded in associated with respective different versions. In this example, a URL 5057_a_ in a version 5055_d_, a URL 5057_b_ in a version 5055_e_, and a URL 5057_c_ in a version 5055_f_ are recorded. The above can achieve backward compatibility for many years. For example, it is assumed that a user purchases a product (the parent device 45) in version 1 this year and the product has RF-ID. Under the assumption, it is expected that, in twenty or thirty years, programs described in virtual machine languages or the like such as Java™, which are compliant to versions 1, 2, and 3, will be installed into the parent device 45. In the situation, the child device 5050 can provide the parent device 45 with the child device version information 5052. Based on the child device version information 5052, the parent device 45 can select a program to be compliant to an appropriate version. It is also expected that, in thirty years, the child device will hold information of programs in all versions 1, 2, and 3. Therefore, a different parent device 45 in version 3 employs the best function of a version among them. On the other hand, the former parent device 45 in version 1 employs a rather limited function of a version older than the version employed by the parent device 45 in version 3. As a result, perfect compatibility can be achieved.

Figure 87:
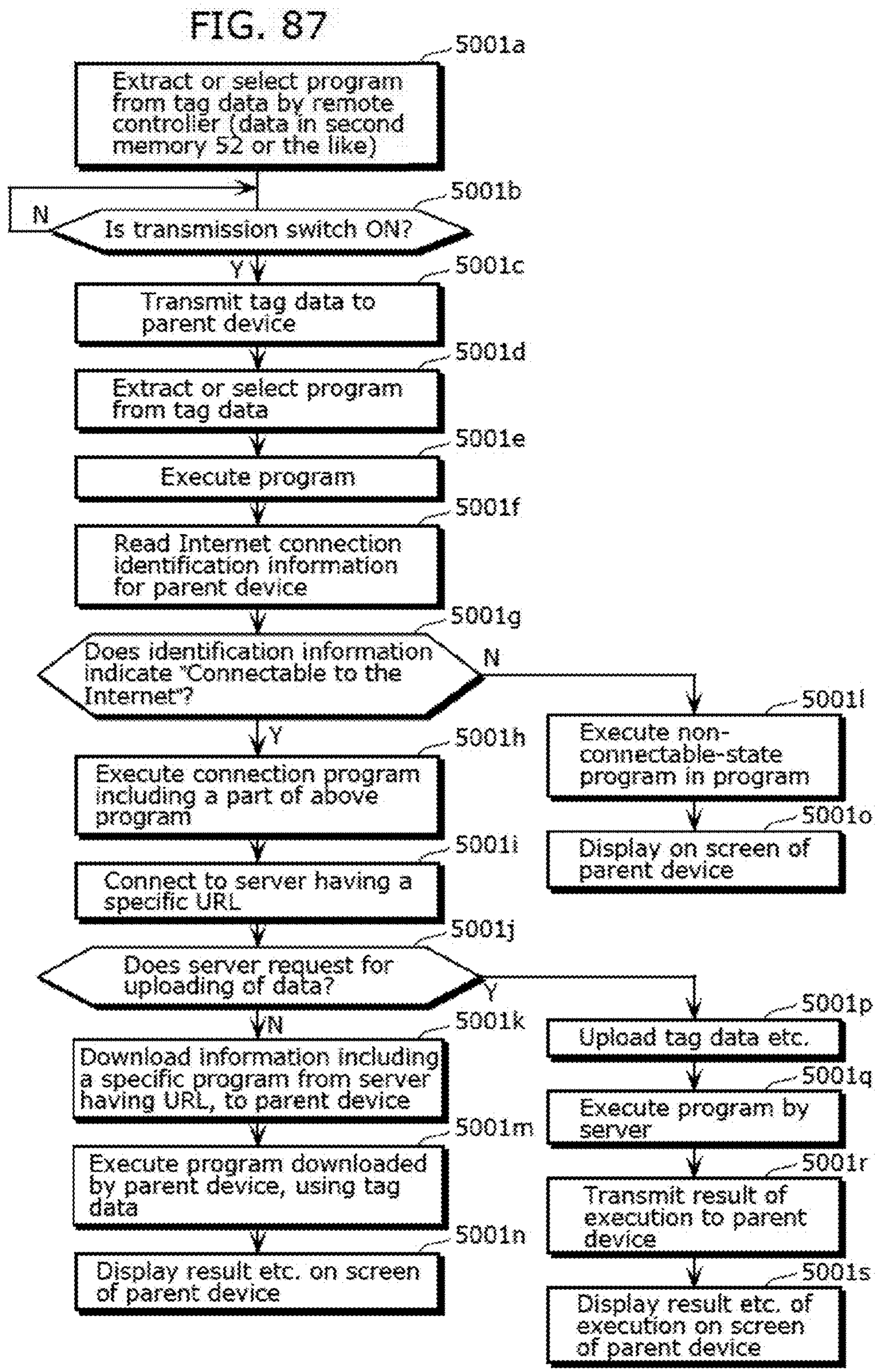
FIG. 87 is a flowchart of processing performed by the above configuration according to Embodiment 7 of the present invention.

The flowchart of FIG. 87 is explained below. In Step 5001_a_, pressing a read switch 6066 on the remote controller 5051, a user brings the remote controller 5051 into proximity of the antenna 21 of the child device 5050. Thereby, data in the memory 52 of the child device 5050 is transmitted to the memory 5061 of the remote controller 5051. Next, in Step 5001_b_, facing the remote controller 5051 to the parent device 45 such as a TV, the user presses a transmission switch 6065 (Step 5001_b_). Thereby, the data in the memory 5061 is transmitted as light to the parent device 45 (Step 5001_c_). In the embodiment of the present invention, the data is referred to as "tag data" for convenience. The parent device 45 extracts or selects an execution program from the tag data (Step 5001*d*). The parent device 45 executes the extracted or selected execution program by a virtual machine language set in the parent device 45 (Step 5001*e*). The parent device 45 reads Internet connection identification information for the parent device 45 (Step 5001*f*). In Step 5001*g*, it is determined whether or not the identification information does not indicate "Connectable to the Internet" (in other words, it is determined based on the identification information whether or not the parent device 45 is connectable to the Internet. If the identification information does not indicate "Connectable to the Internet" until Step 5001*g*, then the parent device 45 executes a non-connectable-state program in the execution program (Step 5001*t*). The non-connectable-state program is to be executed when the parent device 45 is not connectable to the Internet. Then, the parent device 45 displays a result of the execution on its screen (Step 5001*u*). In the embodiment of the present invention, the memory 52 stores not only the information regarding connection to the Internet, but also the non-connectable-state program to be executed when the parent device 45 is not connectable to the Internet. Therefore, the parent device 45 can display a result of a minimum required operation when the parent device 45 is not connectable to the Internet.

On the other hand, if it is determined in Step 5001*g* that the identification information indicates "Connectable to the Internet", then the parent device 45 executes a connection program (Step 5001*h*). The connection program includes a part of the above execution program.

The connection program may be generated by adding, into the execution program in the tag data, data such as a URL of the server, user ID, and a password. More specifically, the added such as a URL of the server, user ID, and a password are added in the data region 5054 illustrated in (a) of FIG. 86. Such connection program can extend the execution program in the tag data, and also reduce a capacity of the nonvolatile memory in the memory 52. In this case, it is also possible that the connection program in the memory 52 is recorded onto a memory such as a non-rewritable ROM in the program region 5053, while the URL of the server and the like are recorded onto the data region 5054 that is rewritable. As a result, a tip area and a cost can be reduced.

In Step 5001*i*, the parent device 45 connects to a server having a specific URL. In Step 5001*j*, it is determined whether or not the server requests the parent device 45 to upload data to the server. If the server requests for uploading of data, then in Step 5001*p*, the parent device 45 uploads data and/or a program to the server. The server executes a program using the data (Step 5001*q*). The server provides a result of the execution to the parent device 45 (Step 5001*r*). The parent device 45 displays the result and the like of the execution on its screen (Step 5001*s*).

On the other hand, if it is determined in Step 5001*j* that the server does not request for uploading of data, then, the parent device 45 downloads information including a specific program from the server having the URL (Step 5001*k*). The parent device 45 executes the downloaded program (Step 5001*m*). Then, the parent device 45 displays the result of the execution on its screen (S5001*n*).

The memory in the RF-ID unit or the child device has a limited capacity due to restriction on power consumption, a volume, or a cost. Therefore, a common program cannot be stored in the memory. However, the use of the connection program and the server as described in the embodiment of the present invention allows an infinitely large program to be executed.

A huge program may be executed on the server. Or, such a program may be downloaded from the server to be executed. These aspects are in the scope of the present invention.

The embodiment described with reference to FIG. 86 has been described to use a remote controller of a TV. In this example, the remote controller has a battery, buttons for switching TV channels, an antenna for reading RF-ID, a communication circuit, and an infrared light emitting unit. The remote controller can be replaced by a mobile phone to produce the same effects as described above. Since mobile phones generally have an infrared light emitting unit, they are easily used instead of remote controllers. In addition, mobile phones have a communication line. Therefore, mobile phones can offer the same capability of that of remote controller, being directly connected to the server. However, a communication cost of a mobile phone is burden of a user. A display screen of a mobile phone is significantly smaller than that of a TV. Therefore, a mobile phone may have the transmission switch 6065 as illustrated in FIG. 86. Thereby, if there is a TV near the mobile phone, the user faces the light emitting unit of the mobile phone to the TV to transmit tag data in the memory 52 of the mobile phone directly to the TV. As a result, the user can view data on a large screen of the TV having a high resolution. The above method does not incur a cost, which is greatly advantageous for the user. The communication using the readout tag data via the mobile phone line is stopped in cooperation with the transmission switch.

In this case, in the same manner as described for as the remote controller with reference to FIG. 86, the mobile phone has at least a reader for RF-ID or a Near Field Communication (NFC) unit. In the future, mobile phones are expected to have a reader function for reading RF-ID or the like. If RF-ID readers are provided to mobile phones, the present invention can be implemented with a much lower additional cost, which is greatly advantageous for the user. Moreover, the present invention can be easily implemented not only as a remote controller or a mobile phone, but also as a Personal Digital Assistance (PDA) terminal, a laptop, or a mobile media player.

[Embodiment 8]

Figure 88:
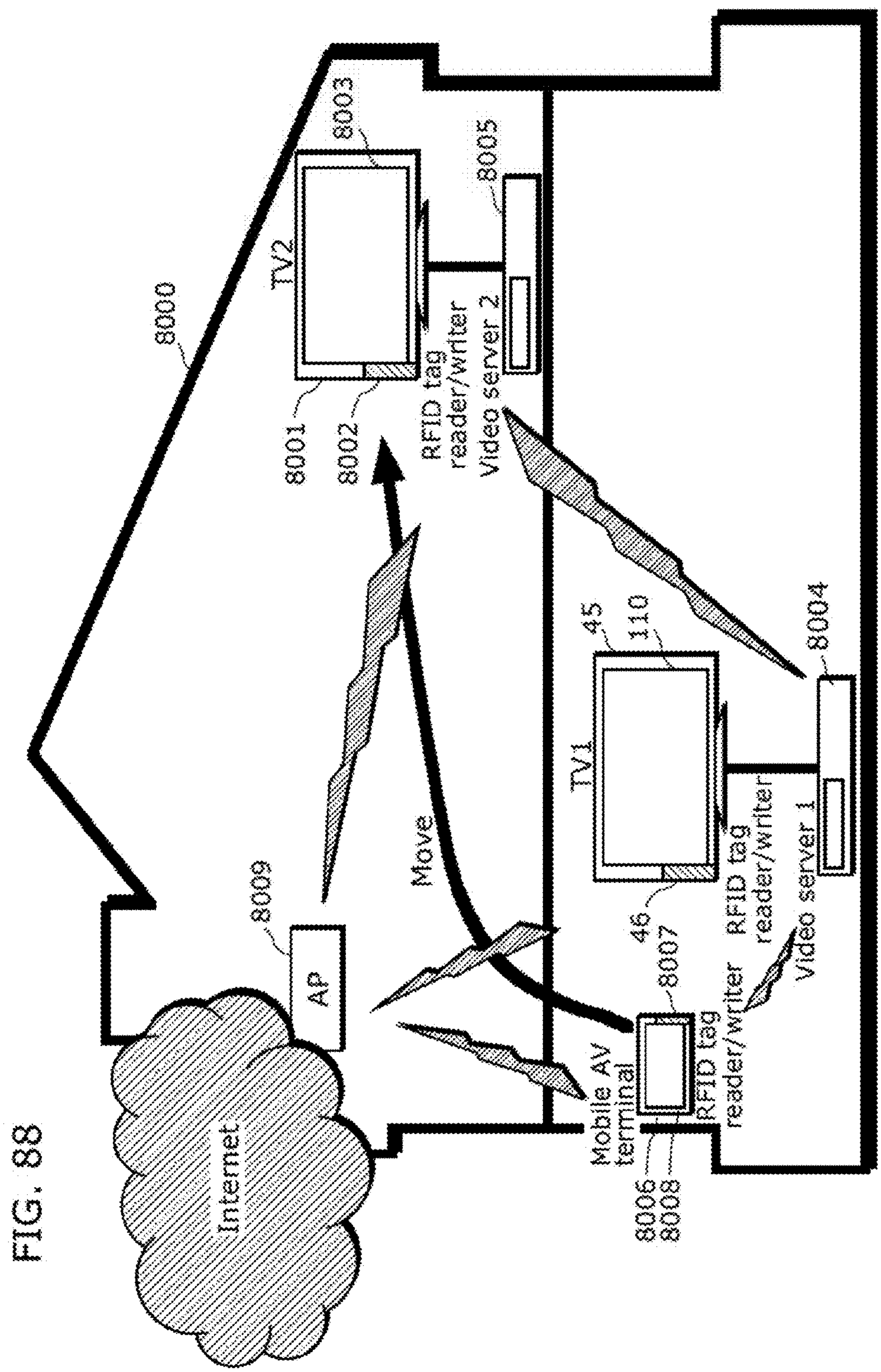
FIG. 88 is a diagram of a network environment.

FIG. 88 illustrates a home network environment assumed in Embodiment 8. It is assumed that two TVs 45 and 8001 are present in one house, where the TVs 45 and 8001 respectively have RFID tag reader/writers and screen display units 110 and 8003. The TVs 45 and 8001 are respectively connected with video servers 8004 and 8005, enabling video data to be transmitted from the video server to the TV wiredly or wirelessly and displayed by the TV. The video server mentioned here is a storage device such as a NAS unit, or a recording device such as a BD recorder. The TVs 45 and 8001 can also access a video server outside the house via the Internet. It is further assumed that the user of the home network has a mobile AV terminal 8006 that is portable and capable of displaying video. Like the TVs, the mobile AV terminal 8006 has a RFID tag 8007 and a video display unit 8008, and can access a video server wirelessly.

In Embodiment 8, consider a situation where, under the above-mentioned environment, the user who is watching video on the TV 1 (45) wants to watch it on the TV 2 (8001) upstairs. In the case of moving to another place to watch the video, it is desirable that the user can watch the video seamlessly from the point up to which the user has already watched. However, in order to seamlessly move the video while maintaining security, user authentication and timing synchronization are necessary, and the user is required to perform complex operations. This is because a highly versatile apparatus (device) such as a TV or a mobile terminal can be used in various applications, so that the user wishes to operate the apparatus depending on circumstances.

In this embodiment of the present invention, the mobile AV terminal transmits a program according to a status of the mobile AV terminal, and generates a video display destination change command using a status of the TV received as a response. In this way, by an extremely simple operation of causing the mobile AV terminal and the TV touch each other, video passing according to the statuses of both terminals can be achieved, with it being possible to significantly improve user-friendliness. Though the following describes video passing, the same advantageous effects can be attained even in the case of continuously displaying still images by a slide show or the like.

In this embodiment of the present invention, according to the above structure, video passing can be performed by an extremely simple operation of causing the mobile AV terminal and the TV touch each other, thereby significantly improving user-friendliness.

Figure 89:
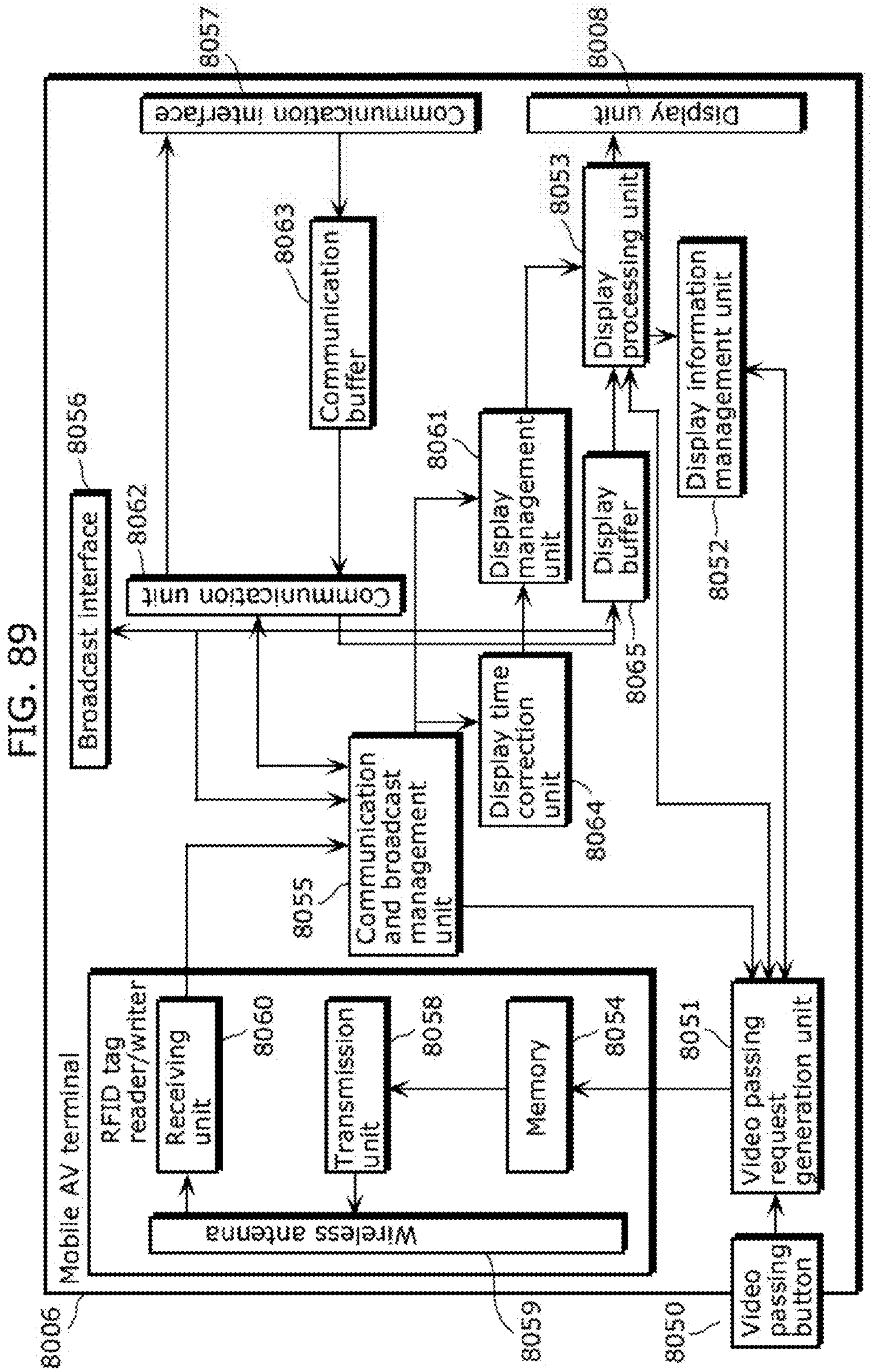
FIG. 89 is a functional block diagram of a mobile AV terminal.

FIG. 89 is a functional block diagram of each function executed by the mobile AV terminal 8006. To perform video passing, the user presses a video passing button 8050. When the video passing button 8050 is pressed, a video passing request generation unit 8051 obtains video information currently displayed by the display unit 8008 from a display information management unit 8052, generates a video passing request, and writes the video passing request to a memory 8054 of the RFID unit. In the case where no video is being displayed, the mobile AV terminal 8006 enters a video get mode, and the video passing request generation unit 8051 generates the video passing request including a video get command. In the case where video is being displayed, the mobile AV terminal 8006 enters a video give mode, and the video passing request generation unit 8051 generates the video passing request including a video give command and video information. The video information mentioned here includes video display time information managed in the display information management unit 8052 and connection destination information managed in a communication and broadcast management unit 8055. When receiving video via a broadcast interface 8056, the communication and broadcast management unit 8055 manages channel information. When receiving video via a communication interface 8057, the communication and broadcast management unit 8055 manages an identifier of a video server and an identifier of video. The identifier of the video server and the identifier of the video may be any identifiers uniquely identifying the video server and the video, such as an IP address and a URL. Note that the video passing button may be provided separately as a video get button and a video give button. Moreover, selection of whether to get or give video may be displayed on the screen when the video passing button is pressed. When another RFID tag is brought into proximity, information stored in the memory 8054 in the RFID unit is transmitted from a transmission unit 8058 via a wireless antenna 8059. In the case where no transmission is made within a predetermined time after the generation of the video passing command, the video passing mode is cancelled, and the information in the memory is discarded. A receiving unit 8060 in the RFID unit receives a video passing response. The video passing response is a response indicating whether or not the video get command or the video give command is accepted. In the case where the video passing response indicates that the video get command is accepted, the video passing response includes video information. The video passing response is outputted to the communication and broadcast management unit 8055, and the communication and broadcast management unit 8055 performs processing according to the video passing response. In the case where the video passing response indicates that the video get command is accepted, the communication and broadcast management unit 8055 performs video get processing. In the case where the video information included in the video passing response is channel information, the communication and broadcast management unit 8055 notifies the broadcast interface 8056 of the channel information, to receive data of a channel designated by the channel information. The communication and broadcast management unit 8055 also instructs a display management unit 8061 to display the data of the channel. In the case where the channel information designates a channel (a channel of BS, CS, or cable TV) that is not receivable by the broadcast interface 8056 of the mobile AV terminal 8006, the communication and broadcast management unit 8055 requests a communication unit 8062 to search for a terminal that is capable of receiving data of the channel and transferring it to the communication interface 8057. Note that the search for the terminal that serves to transfer the data of the channel may be performed beforehand. Even when the data of the channel is received by the communication interface 8057, the data of the channel is displayed by the display unit 8008 in the same way as in the normal case. In the case where the video information included in the video passing response is connection destination information, the communication and broadcast management unit 8055 notifies the communication unit 8062 of the connection destination information, to transmit a video transmission request to a connection destination. The video transmission request includes a video display time, and data transmission is requested according to this time. Note that, unlike video reception by the broadcast interface 8056, video reception by the communication interface 8057 may take some time. This depends on preprocessing for receiving video data by the communication interface 8057 and a time period during which video data is temporarily stored in a communication buffer 8063. In the method of this embodiment, unnecessary data transmission and a waiting time associated with it may be reduced by predicting such a time beforehand and issuing the video transmission request from the communication unit 8062 on the basis of the predicted time. In this case, a display time correction unit 8064 performs correction so that video can be displayed seamlessly. This is possible because data of digital video is typically stored in a display buffer 8065 and displayed by the display unit 8008 while being processed by a display processing unit 8053. On the other hand, in the case where the video passing response indicates that the video give command is accepted, screen display is cleared. Note that the screen display may be automatically cleared, or whether or not to clear the screen display may be selected by the user. Alternatively, the screen display may be cleared upon receiving a screen display clearing instruction from the terminal to which video is passed. Moreover, a timer may be provided so that the screen display is cleared after a predetermined time has elapsed.

Figure 90:
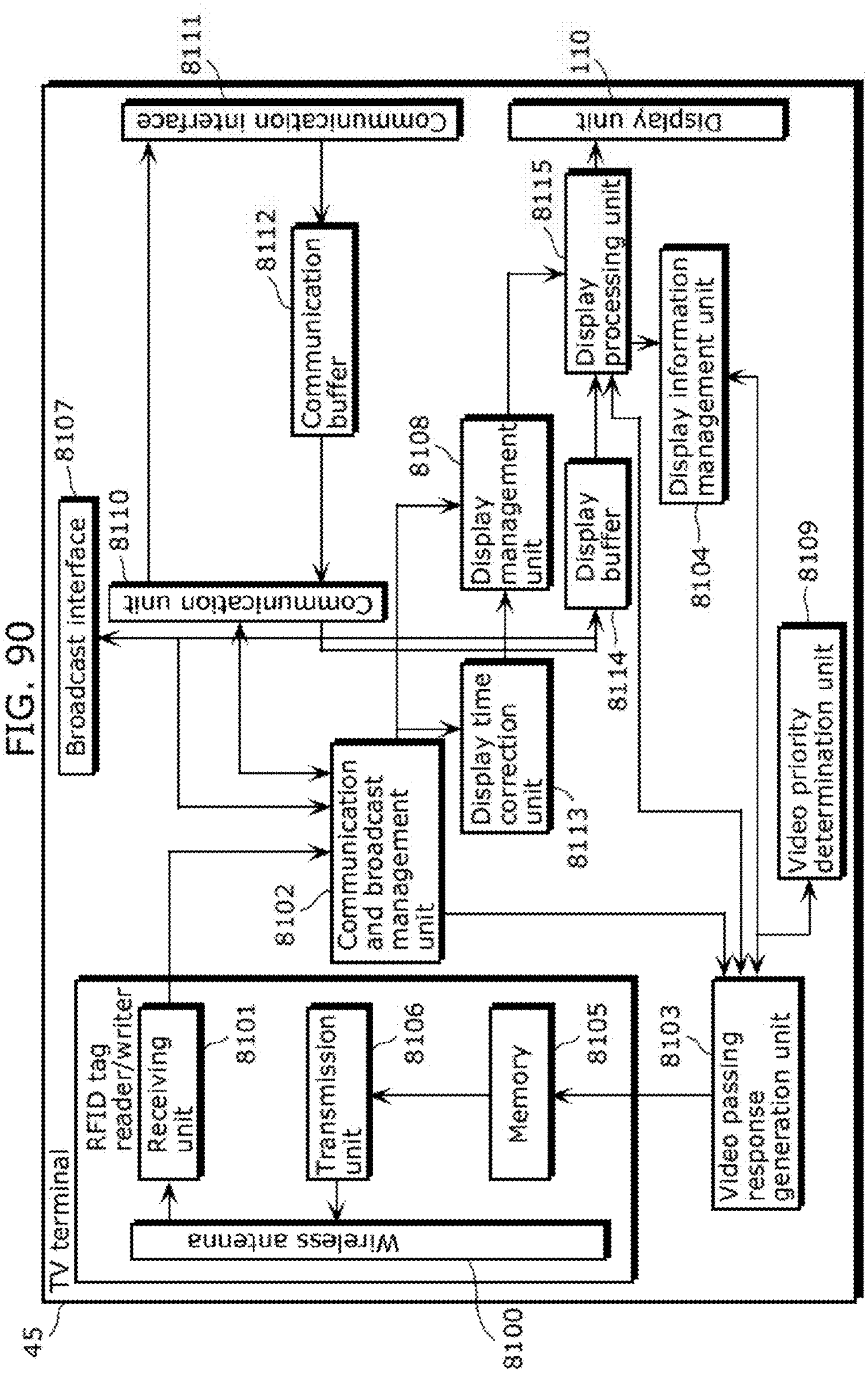
FIG. 90 is a functional block diagram of a TV.

FIG. 90 is a functional block diagram of each function executed by the TV. A receiving unit 8101, upon receiving a video passing request from an antenna 8100 of a RFID tag, outputs the video passing request to a communication and broadcast management unit 8102. In the case where the received video passing request is a video get command, the communication and broadcast management unit 8102 outputs managed connection destination information of displayed video, to a video passing response generation unit 8103. Upon receiving the connection destination information, the video passing response generation unit 8103 obtains display time information from a display information management unit 8104, generates a video passing response, and writes the video passing response to a memory 8105 in the RFID unit. Here, when the video passing response generation unit 8103 cannot obtain desired information, the video passing response generation unit 8103 generates the video passing response indicating that the video passing request is rejected. A transmission unit 8106 transmits the written video passing response to the RFID unit of the mobile AV terminal 8006. Video display termination processing after transmission is the same as in the mobile AV terminal 8006. In the case where the received video passing request is a video give command, on the other hand, the communication and broadcast management unit 8102 performs processing according to information included in the video passing request. In the case where channel information is included in the video passing request, the communication and broadcast management unit 8102 notifies a broadcast interface 8107 of the channel information, to receive data of a desired channel designated by the channel information. The communication and broadcast management unit 8102 then notifies a display management unit 8108 of the data of the channel, thereby changing the display. In the case where the video giving command is received while video is being displayed, determination of which video is to be prioritized may be made by a video priority determination unit 8109, or a selection command may be displayed. In the case where connection destination information is included in the video passing request, the communication and broadcast management unit 8102 notifies a communication unit 8110 of the connection destination information, to transmit a video transmission request. Subsequent processing is the same as in the mobile AV terminal. Moreover, the functions of the other units are the same as those in the mobile AV terminal.

Figure 91:
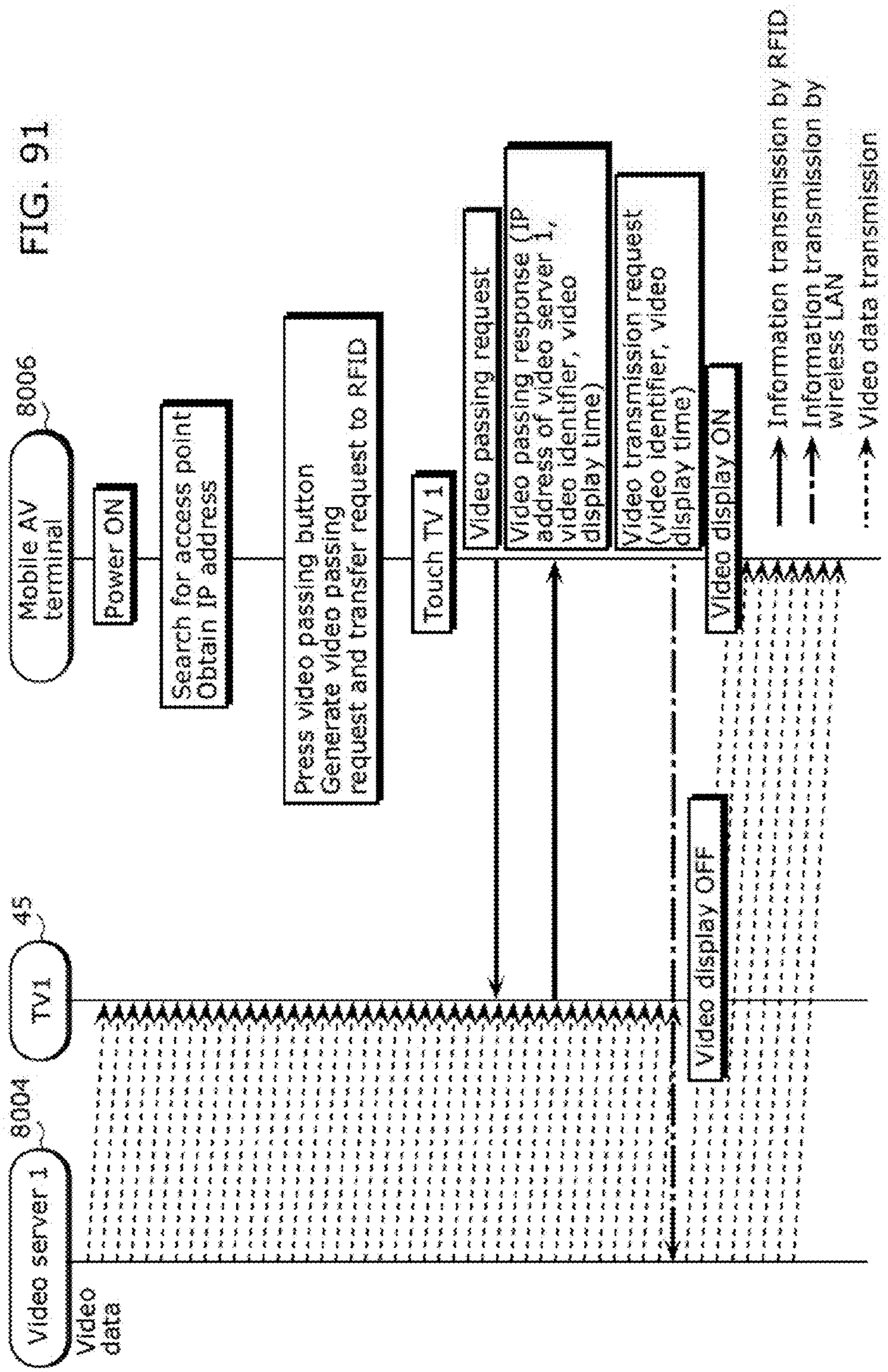
FIG. 91 is a sequence diagram in the case where the mobile AV terminal gets video (first half, control performed by get side).

FIG. 91 is a sequence diagram in the case where, when the TV 1 (45) is receiving video from the video server 1 (8004), the video is passed to the mobile AV terminal 8006. To perform video passing, the user powers on the mobile AV terminal 8006. The mobile AV terminal 8006 searches for an access point 8009 of the wireless LAN, and establishes wireless connection. The mobile AV terminal 8006 also obtains an IP address by DHCP or the like, and establishes IP connection. In the case where the mobile AV terminal 8006 is a DLNA terminal, DLNA terminal search processing such as M-SEARCH may be performed. The user presses the video passing button, to generate a video passing request in the memory in the RFID unit. The user further brings the RFID tag 8007 of the mobile AV terminal 8006 into proximity of the RFID tag reader/writer 46 of the TV 1, to transmit the video passing request to the TV 1. Upon receiving the video passing request, the TV 1 generates a video passing response (including an IP address of the video server 1, a video identifier, and a video display time), and returns the video passing response to the mobile AV terminal 8006. It is assumed here that the TV 1 obtains the IP address of the video server 1 beforehand, even when the video receiving means of the TV 1 has no IP connection such as a HDMI cable. In the case where the video is in encrypted form, necessary security-related information (such as a key) is exchanged at the same time. Upon receiving the video passing response, the mobile AV terminal 8006 transmits a video transmission request (including the video identifier and the video display time) to the IP address of the video server 1 included in the video passing response. Upon receiving the video transmission request, the video server 1 (8004) switches a video transmission destination to the mobile AV terminal 8006. Having no longer received the video data, the TV 1 (45) turns video display OFF.

Figure 92:
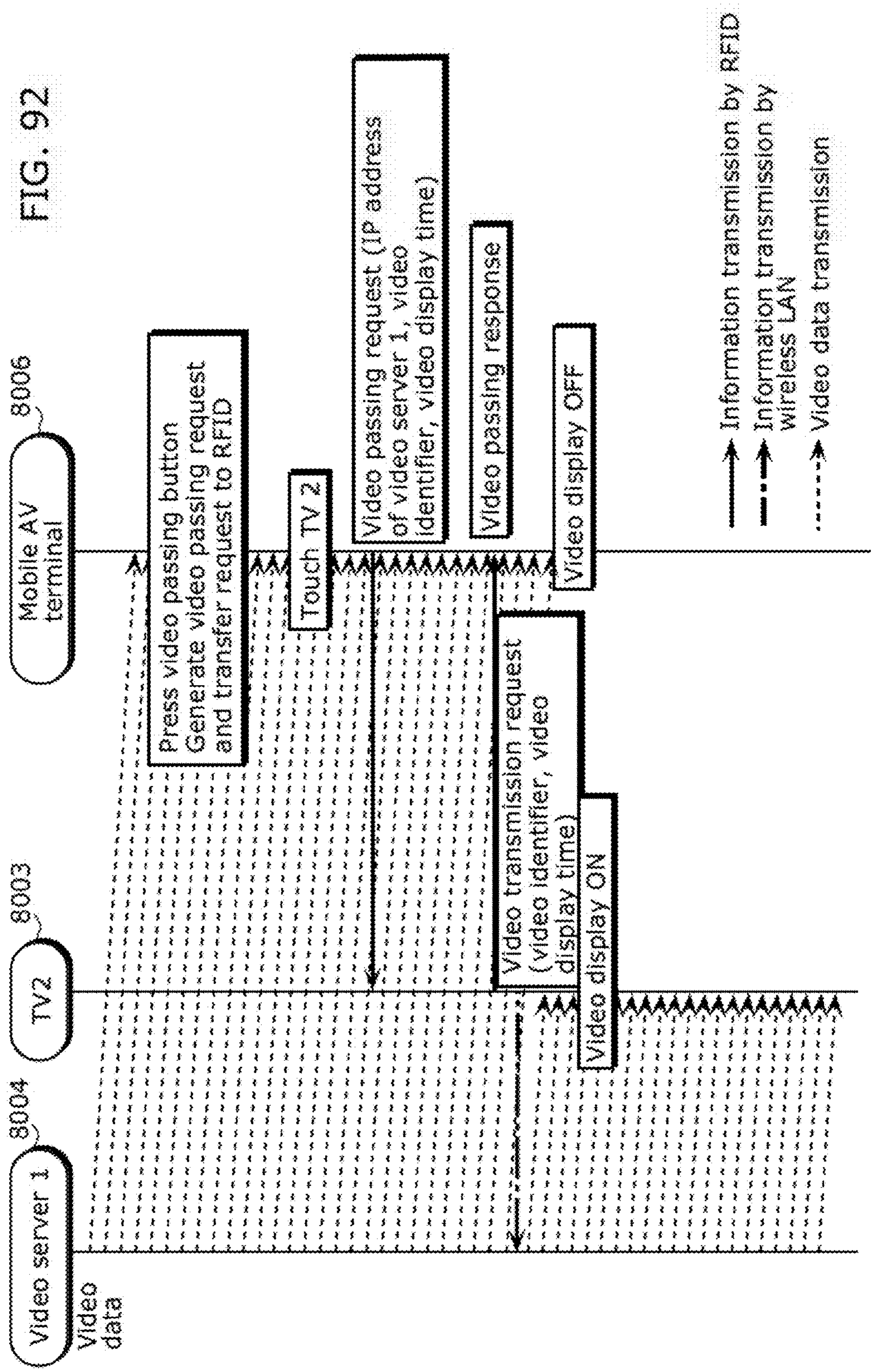
FIG. 92 is a sequence diagram in the case where the mobile AV terminal gives video (second half, control performed by get side).

FIG. 92 is a sequence diagram in the case where, when the mobile AV terminal 8006 is receiving the video from the video server 1 (8004), the video is passed to the TV 2 (8003). The user presses the video passing button of the mobile AV terminal 8006, to generate a video passing request (including the IP address of the video server 1, the video identifier, and the video display time). The user further brings the RFID tag 8007 of the mobile AV terminal 8006 into proximity of a RFID tag reader/writer 8002 of the TV 2, to transmit the video passing request to the TV 2. The TV 2 (8003) generates a video passing response indicating that the video passing request is accepted, and returns the video passing response to the mobile AV terminal 8006. The TV 2 (8003) transmits a video transmission request to the video server 1 (8004). Subsequent processing is the same as in FIG. 91.

Figure 93:
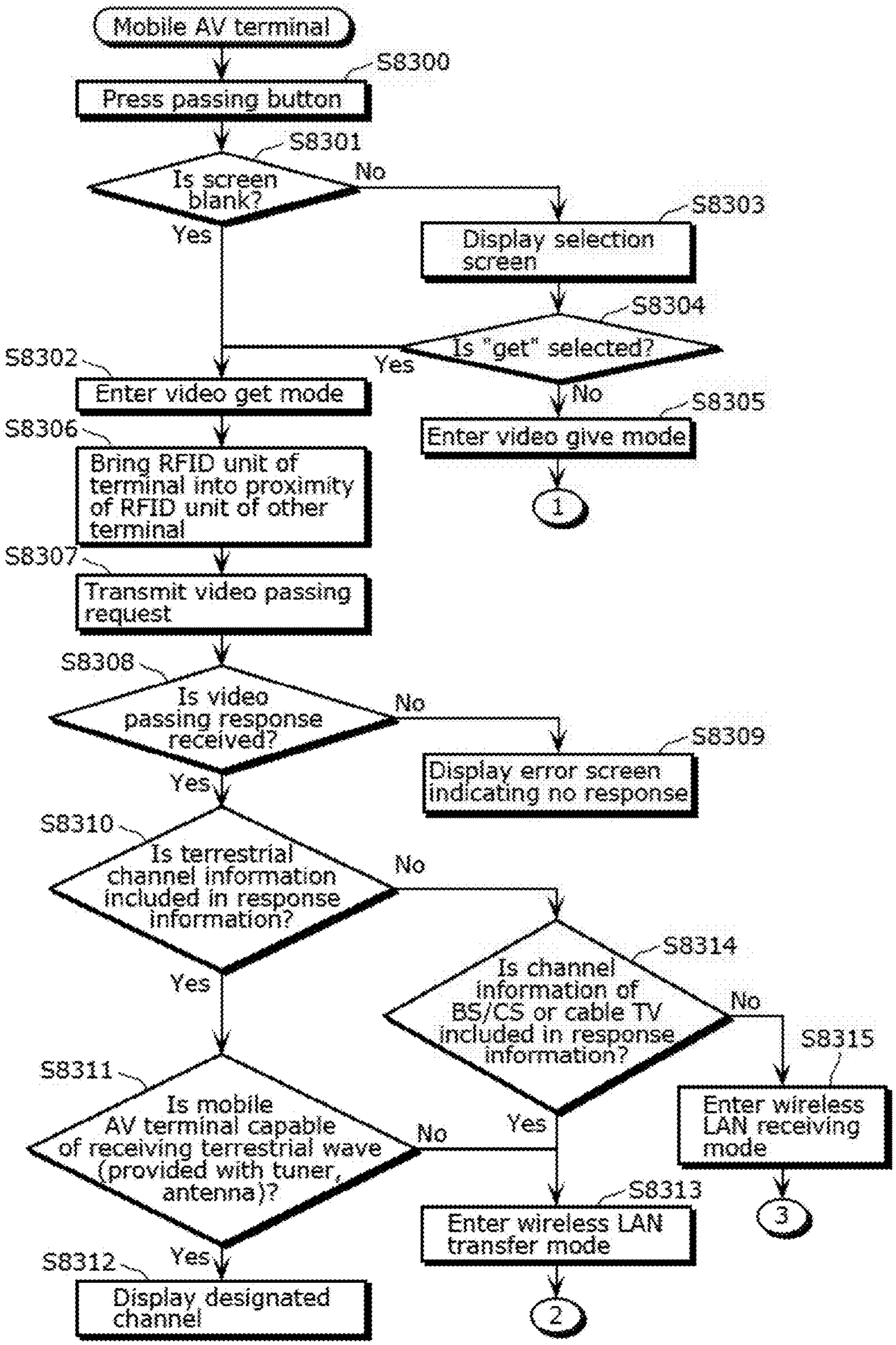
FIG. 93 is a basic flowchart of the mobile AV terminal.

FIG. 93 is a flowchart of processing of the mobile AV terminal 8006. When the user presses the video passing button (S8300), the mobile AV terminal 8006 enters a video get mode (S8302) in the case where the screen is blank (or has no video display) (S8301). In the case where the screen is not blank, a selection screen is displayed (S8303). When the user selects "get" (S8304), the mobile AV terminal 8006 equally enters the video get mode. When the user selects "give", the mobile AV terminal 8006 enters a video give mode (S8305). In the video get mode, the mobile AV terminal 8006 stores a video passing request including a video get command in the memory 8105 in the RFID unit. The user brings the RFID unit of the mobile AV terminal 8006 into proximity of the RFID unit of the other terminal (S8306), to transmit the video passing request to the other terminal (S8307). Upon receiving a video passing response from the other terminal (S8308), the mobile AV terminal 8006 performs processing according to information included in the video passing response. In the case where no response is obtained, the mobile AV terminal 8006 displays an error screen indicating no response, and ends processing (S8309). In the case where terrestrial channel information is included in the video passing response, the mobile AV terminal 8006 determines whether or not the mobile AV terminal 8006 is capable of receiving the corresponding channel (that is, whether nor not the mobile AV terminal 8006 has a tuner and an antenna and is in a terrestrial wave receivable range). In the case where the mobile AV terminal 8006 is capable of receiving the channel (S8311), the mobile AV terminal 8006 displays data of the designated channel. In the case where the mobile AV terminal 8006 is not capable of receiving the channel, the mobile AV terminal 8006 enters a wireless LAN transfer mode (S8313). Likewise, in the case where channel information of BS or the like, which is basically not receivable by the mobile AV terminal 8006, is included in the video passing response (S8314), the mobile AV terminal 8006 enters the wireless LAN transfer mode. On the other hand, in the case where no channel information is included in the video passing response, the mobile AV terminal 8006 enters a wireless LAN receiving mode (S8315).

Figure 94:
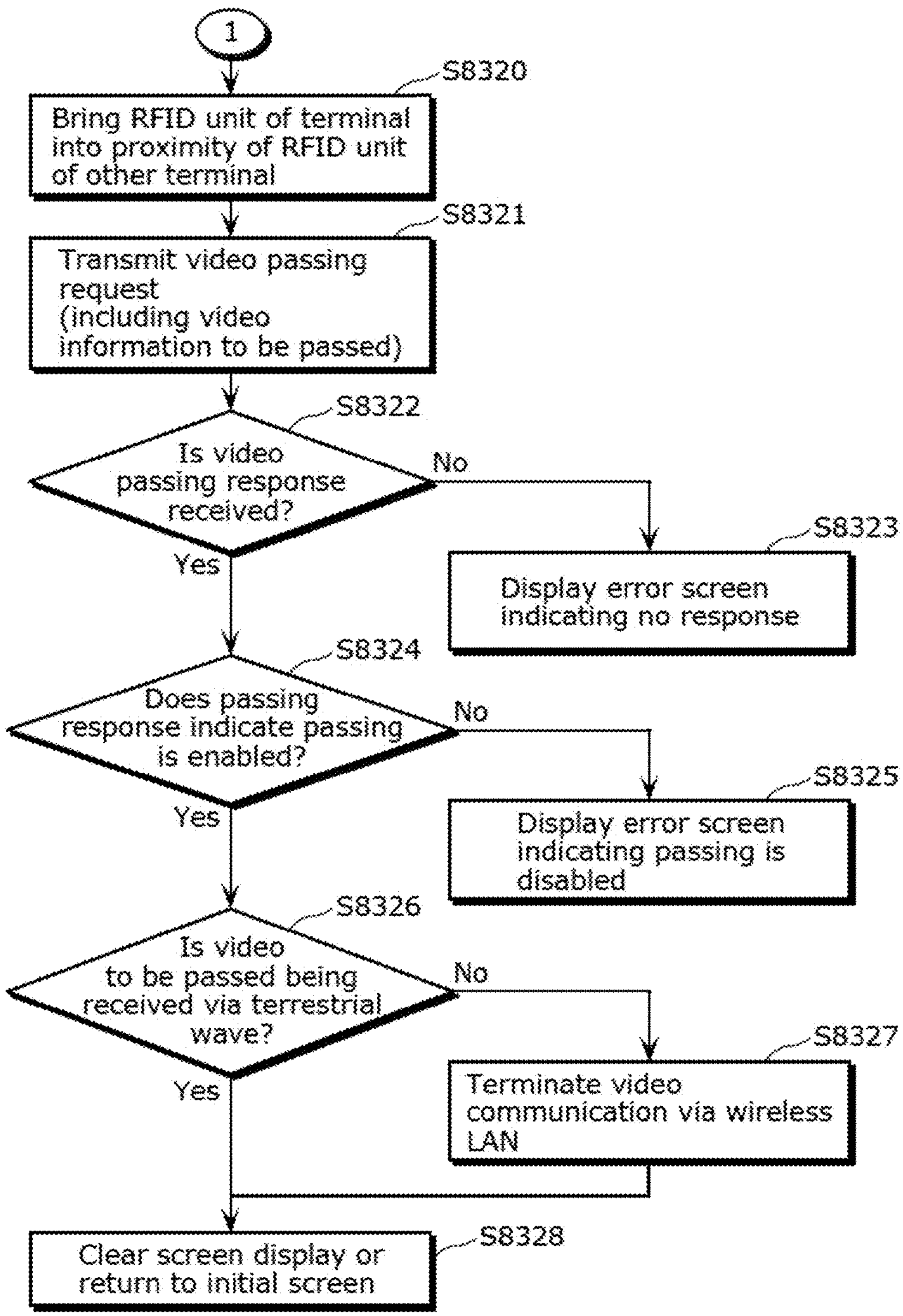
FIG. 94 is a flowchart of a give mode of the mobile AV terminal.

FIG. 94 is a flowchart of processing of the mobile AV terminal 8006 in the video give mode. In the video give mode, the mobile AV terminal 8006 stores a video passing request including a video give command and information of video to be given, in the memory 8054 in the RFID unit. The user brings the RFID unit of the mobile AV terminal 8006 into proximity of the RFID unit of the other terminal (S8320), to transmit the video passing request to the other terminal (S8321). Upon receiving a video passing response from the other terminal (S8322), the mobile AV terminal 8006 performs processing according to information included in the video passing response. In the case where no response is obtained, the mobile AV terminal 8006 displays an error screen indicating no response, and ends processing (S8323). In the case where the video passing response indicates that video passing is disabled (S8324), the mobile AV terminal 8006 displays an error screen indicating that video passing is disabled, and ends processing (S8325). In the case where video passing is enabled and video to be passed is being received via terrestrial wave (S8326), the mobile AV terminal 8006 stops screen display of terrestrial broadcasting. Otherwise, the mobile AV terminal 8006 performs termination processing of video that is being received via wireless LAN, according to a type of corresponding receiving system (S8327). The mobile AV terminal 8006 thereby stops screen display. Note that the screen display may be stopped according to an instruction from the terminal to which the video is given, or the screen display may be switched to another screen such as an initial screen (S8328).

Figure 95:
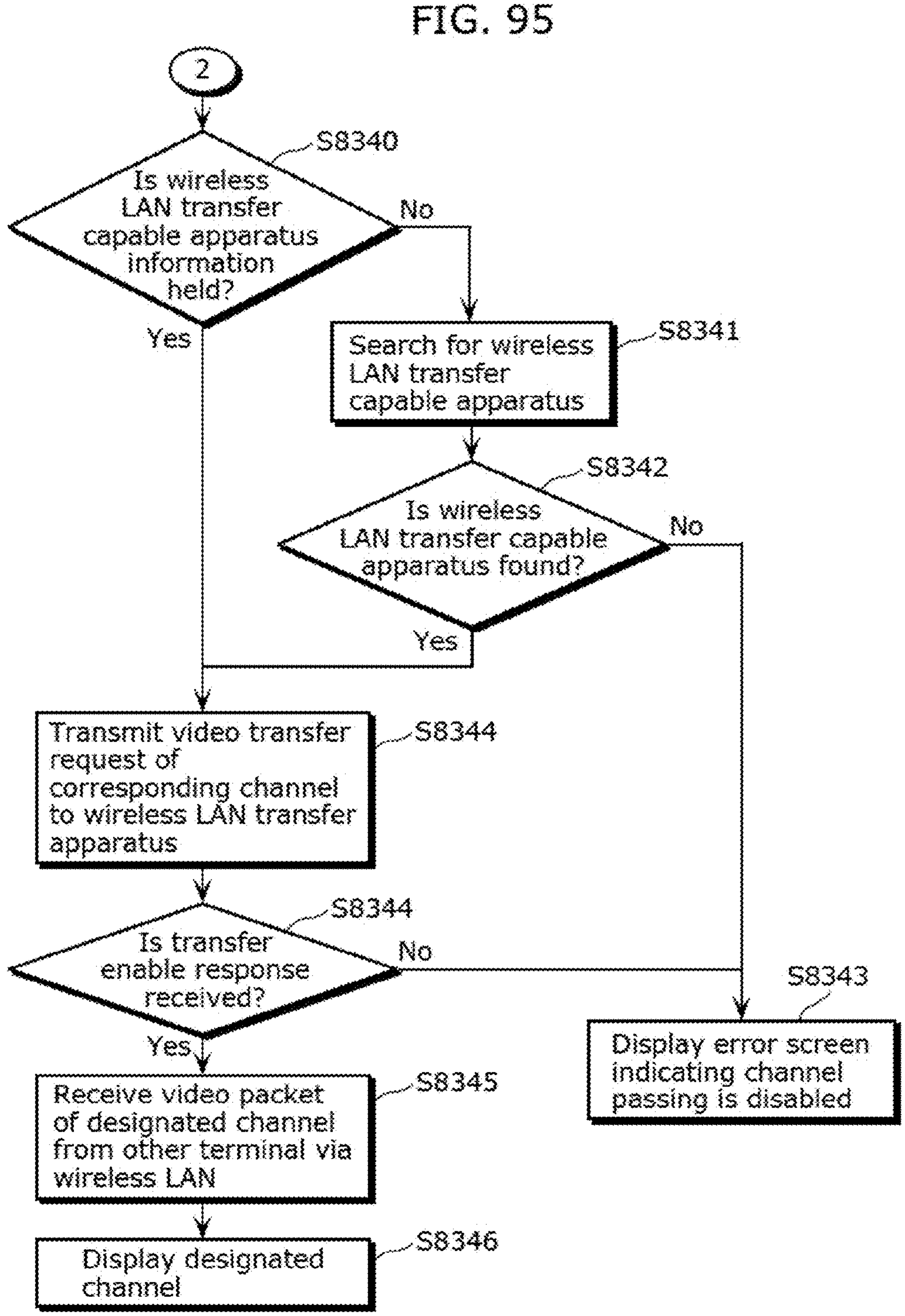
FIG. 95 is a flowchart of a get mode of the mobile AV terminal.

FIG. 95 is a flowchart of processing of the mobile AV terminal 8006 in the wireless LAN transfer mode. The mobile AV terminal 8006 is assumed to be a terminal that is capable of receiving terrestrial wave but is not capable of receiving satellite broadcasting and cable TV broadcasting. To receive such broadcast wave, the broadcast wave needs to be received by another terminal capable of receiving the broadcast wave, and transferred to the mobile AV terminal 8006 via wireless LAN. In the wireless LAN transfer mode, the mobile AV terminal 8006 calls information of a wireless LAN transfer capable apparatus. In the case where the information of the wireless LAN transfer capable apparatus is not held in the mobile AV terminal 8006 (S8340), the mobile AV terminal 8006 searches for the wireless LAN transfer capable apparatus (S8341). In the case where the wireless LAN transfer capable apparatus cannot be found in the house, the mobile AV terminal 8006 displays an error screen indicating that channel passing is disabled (S8343). In the case where the wireless LAN transfer capable apparatus is found or the information of the capable apparatus is held in the mobile AV terminal 8006, the mobile AV terminal 8006 transmits a video transfer request for the channel, to the wireless LAN transfer capable apparatus (S8344). In the case where a video transfer enable response is returned from the wireless LAN transfer capable apparatus, the mobile AV terminal 8006 receives video packets of the designated channel via wireless LAN (S8345), and displays the video of the designated channel (S8346).

Figure 96:
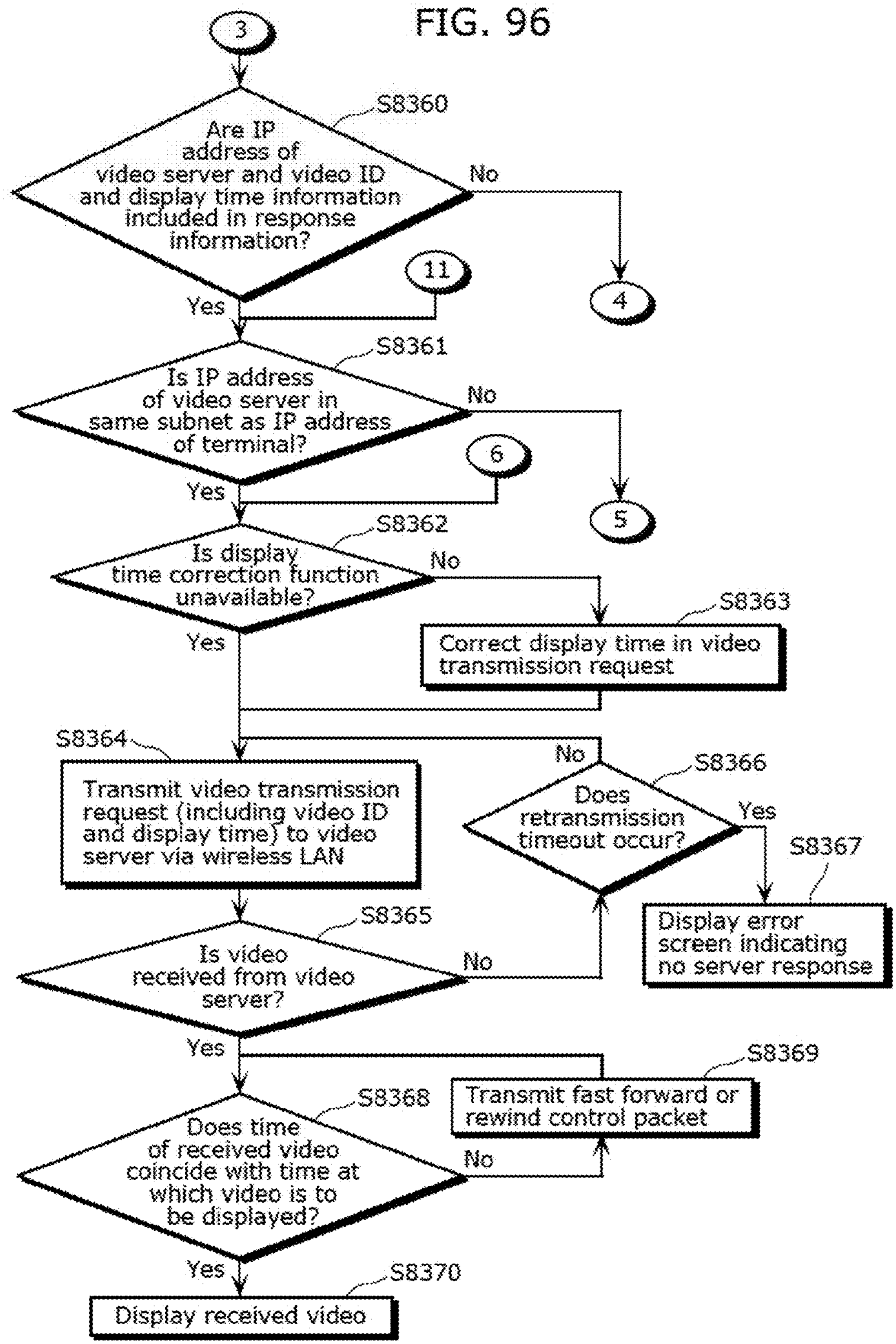
FIG. 96 is a flowchart of a wireless get mode of the mobile AV terminal.

FIG. 96 is a flowchart of processing of the mobile AV terminal 8006 in the wireless LAN receiving mode. In the wireless LAN receiving mode, in the case where the video passing response includes an IP address of a video server and an ID and display time information of video (S8360), the mobile AV terminal 8006 accesses the video server. First, the mobile AV terminal 8006 determines whether or not the IP address of the video server is in the same subnet as the IP address of the mobile AV terminal 8006 (S8361). In the case where the IP address of the video server is in the same subnet as the IP address of the mobile AV terminal 8006, the mobile AV terminal 8006 transmits a video transmission request including the video ID and display time, to the video server (S8364). Note that, in the case where a delay time correction function is available (S8362), the mobile AV terminal 8006 corrects the display time information in the video transmission request (S8363). Here, the display time correction function denotes a correction function that is executed to perform efficient video transfer in consideration of various delay in processing. In the case where video cannot be received from the video server (S8365), the mobile AV terminal 8006 may retransmit the video transmission request. In the case where there is no response even after a predetermined retransmission timeout occurs (S8366), the mobile AV terminal 8006 displays an error screen indicating no server response (S8367). In the case where the time of the received video data does not coincide with the time of display (S8368), the mobile AV terminal 8006 adjusts the time to the time of display using a control packet for fast-forward or rewind (S8369). The mobile AV terminal 8006 then displays video.

Figure 97:
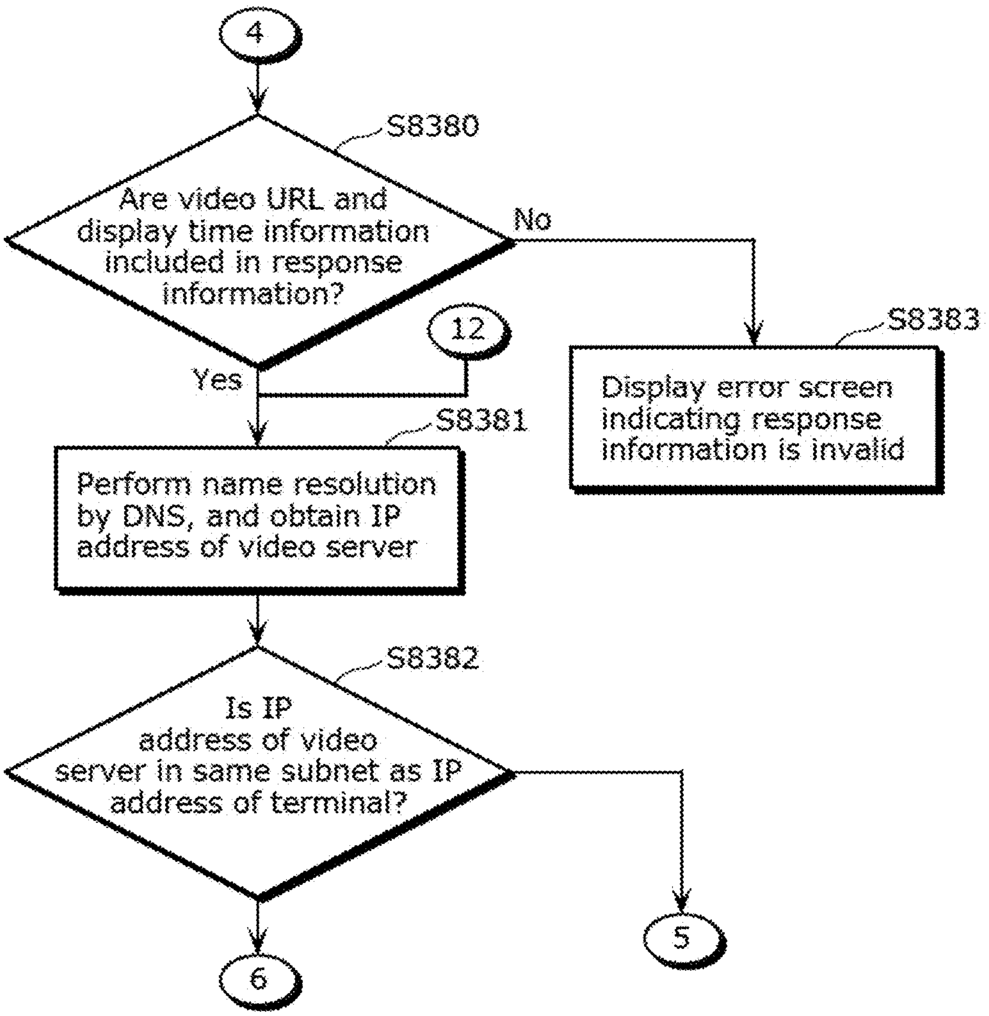
FIG. 97 is a flowchart of a URL get mode of the mobile AV terminal.

FIG. 97 is a flowchart of processing in the case where a URL is included in the video passing response. In the case where the URL is included (S8380), the mobile AV terminal 8006 performs name resolution by DNS, to obtain the IP address of the video server (S8381). Note that the URL for video may be any name assigned for video service. The name resolution also includes conversion to a terminal identifier from a service identifier other than DNS. In the case where the obtained IP address of the video server is in the same subnet as the IP address of the mobile AV terminal 8006 (S8382), the mobile AV terminal 8006 returns to the processing described in FIG. 96. In the case where the IP address of the video server is not in the same subnet as the IP address of the mobile AV terminal 8006, the mobile AV terminal 8006 proceeds to connection processing to a server outside the subnet. In the case where the desired information is not included in the video passing response, the mobile AV terminal 8006 displays an error screen indicating that the video passing response is invalid (S8383).

Figure 98:
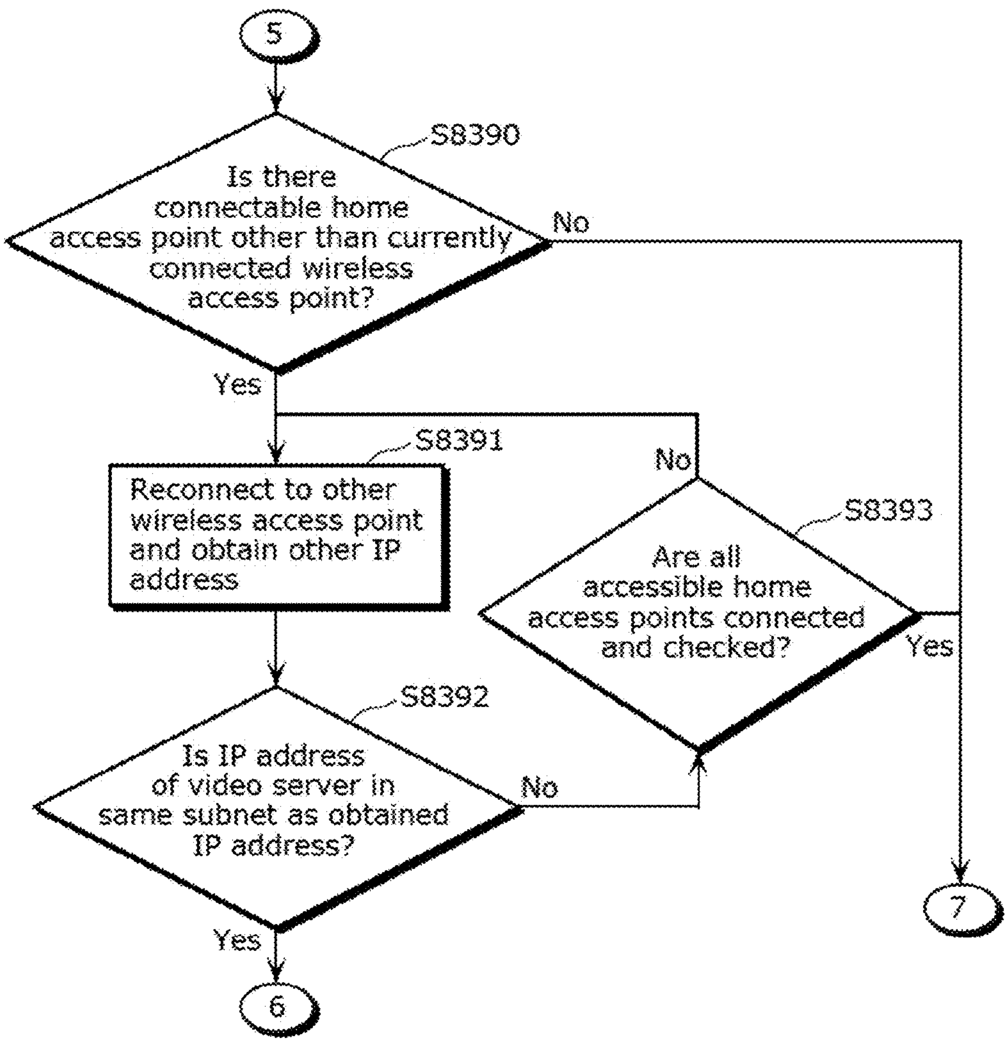
FIG. 98 is a flowchart of server position search by the mobile AV terminal.

FIG. 98 is a flowchart of processing in the case where the IP address of the video server is not in the same subnet as the IP address of the mobile AV terminal 8006. In the case where the IP address of the video server is in a different subnet, the mobile AV terminal 8006 searches for another wireless access point. In the case where there is no other access point in the house, the mobile AV terminal 8006 determines that the video server is an external server, and proceeds to external server connection processing. In the case where there is another access point (S8390), the mobile AV terminal 8006 performs reconnection to the access point, and obtains another IP address of a subnet (S8391). In the case where the subnet of the video server is the same as the subnet of the obtained IP address (S8392), the mobile AV terminal 8006 proceeds to home server processing. In the case where the subnet of the video server is not the same as the subnet of the IP address obtained by connecting to the accessible access point in the house (S8393), the mobile AV terminal 8006 proceeds to external server access processing. Note that the mobile AV terminal 8006 may perform IP address obtainment processing for all access points beforehand and manage the processing result therein.

Figure 99:
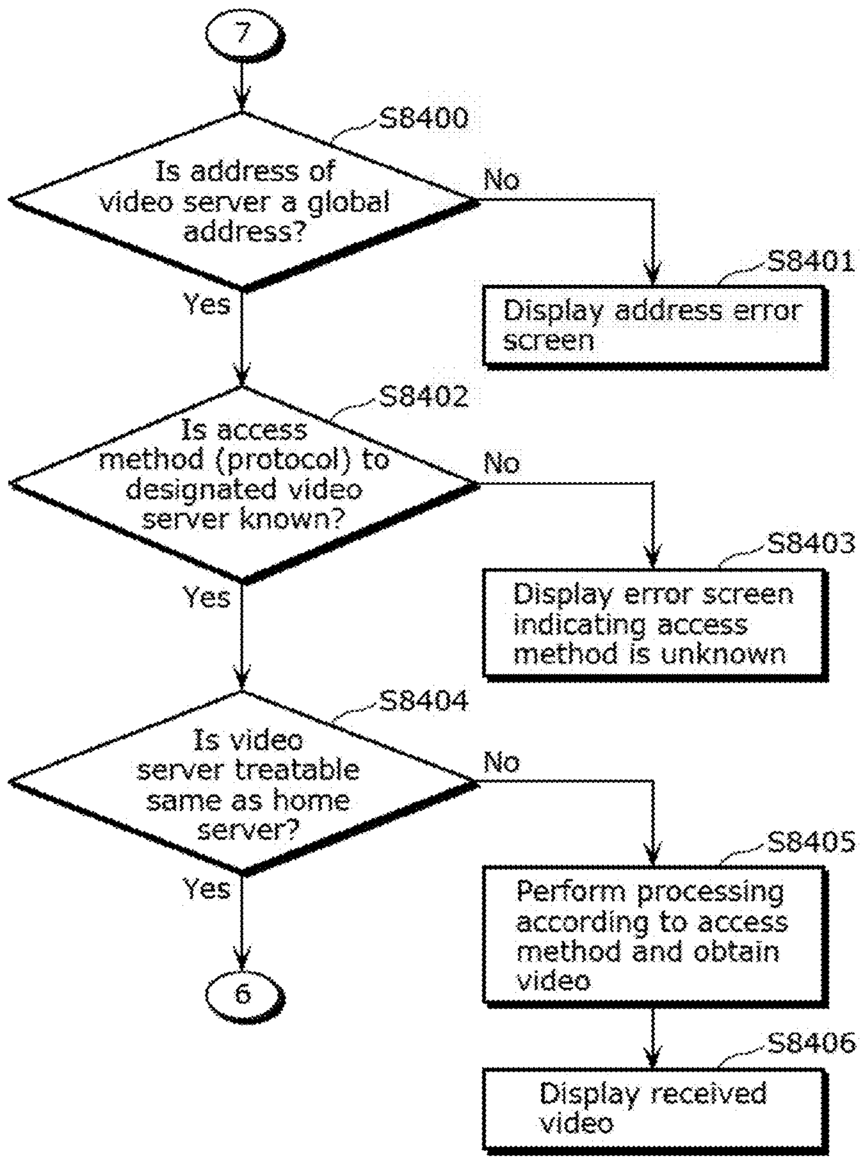
FIG. 99 is a flowchart of a mode in which the mobile AV terminal gets video from an external server.

FIG. 99 is a flowchart of processing in the case of accessing an external server. In the case where the address of the video server is not a global address (S8400), the mobile AV terminal 8006 displays an error screen indicating an address error (S8401). In the case where an access method to the designated video server is unknown (S8402), the mobile AV terminal 8006 displays an error screen indicating that the access method is unknown (S8403). Note that a home video server and a home video appliance are assumed to be compliant with DLNA. In the case where the access method is known and also the video server has the same function as a home server, the mobile AV terminal 8006 performs the same processing as in the case of a home server (S8404). Otherwise, the mobile AV terminal 8006 performs processing according to the access method to obtain video (S8405), and displays the received video (S8406).

Figure 100:
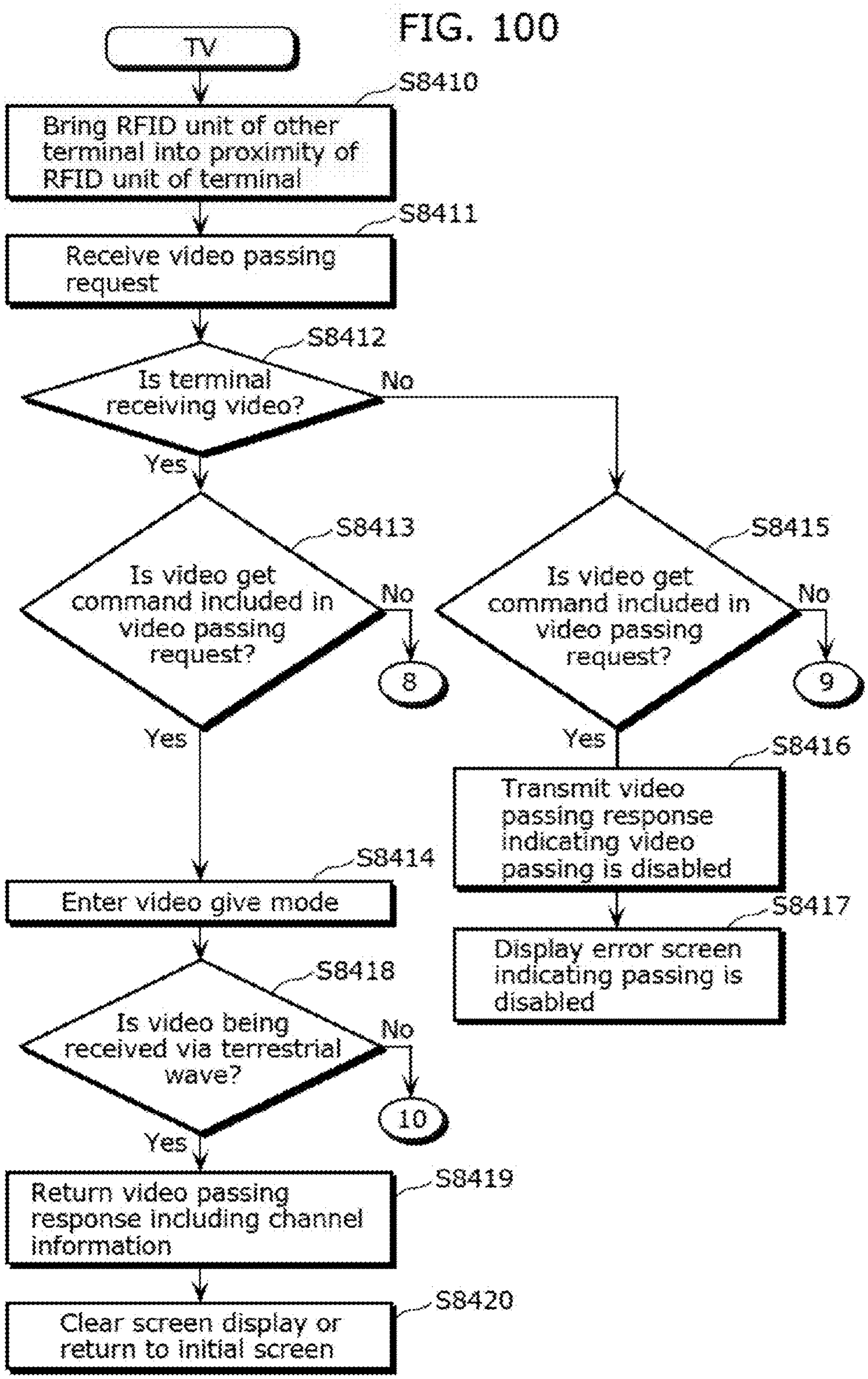
FIG. 100 is a basic flowchart of the TV.

FIG. 100 is a flowchart of processing of the TV. When the RFID unit of the other terminal is brought into proximity of the RFID unit of the TV (S8410), the TV receives a video passing request (S8411). In the case where the TV is receiving video (S8412) and also a video get command is included in the video passing request (S8413), the TV enters a video give mode (S8414). In the case where the TV is not receiving video but the video get command is included in the video passing request (S8415), the TV returns a video passing response indicating that video passing is disabled (S8416), and displays an error screen indicating that video passing is disabled (S8417). In the case where the video is being received via terrestrial wave (S8418), the TV returns the video passing response including channel information (S8419). The TV then clears screen display (S8420).

Figure 101:
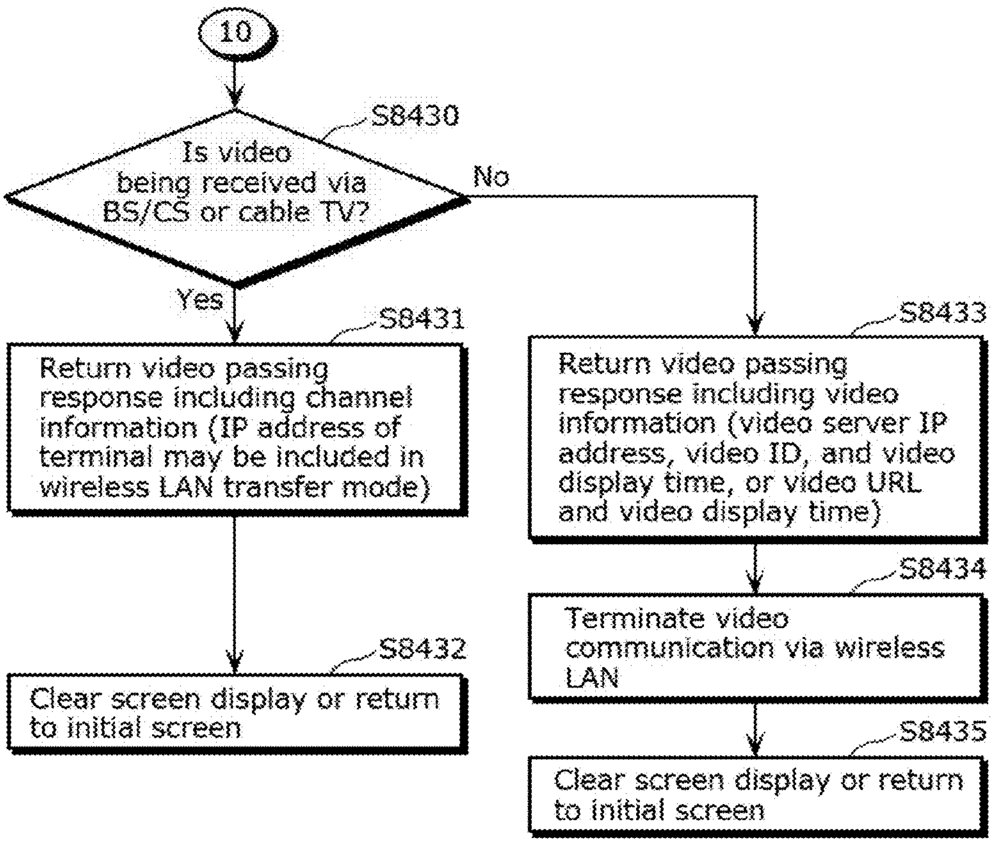
FIG. 101 is a flowchart of a give mode of the TV.

FIG. 101 is a flowchart of processing in the case where the video is being received not via terrestrial wave. In the case where the video being received is broadcast video other than terrestrial wave (S8430), the TV returns the video passing response including channel information. In the case of a wireless LAN transfer mode, the TV may include the IP address of the TV in the video passing response (S8431). After returning the response, the TV clears screen display (S8432). In the case of other video, the TV returns the video passing response including an IP address of a video server, a video ID, and a video display time, or including a video URL and a video display time (S8433). After this, the TV performs termination processing of video communication via wireless LAN (S8434), and clears screen display.

Figure 102:
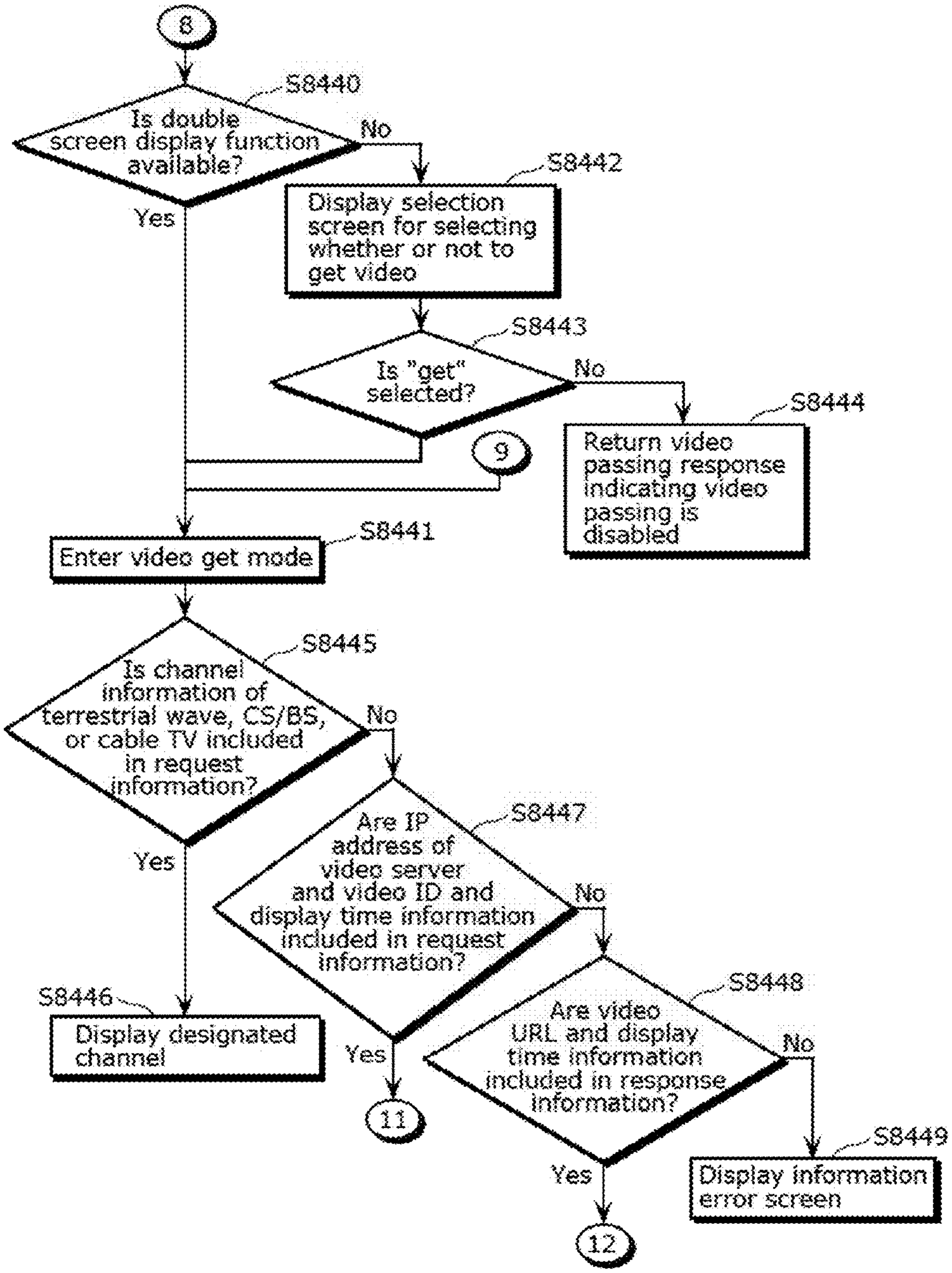
FIG. 102 is a flowchart of a get mode of the TV.

FIG. 102 is a flowchart of processing in the case where a video give command is included in the video passing request. When the TV receives the video give command while displaying video, the TV enters a video get mode (S8441) in the case where a double screen display function is available (S8440). In the case where the double screen display function is not available, the TV displays a selection screen of whether or not to get video (S8442). When the user selects to get video (S8443), the TV enters the video get mode. When the user selects not to get video, the TV returns a video passing response indicating that video passing is disabled (S8444). In the case where channel information is included in the video passing request (S8445), the TV displays data of a designated channel (S8446). In the case where an IP address of a video server or a URL is included in the video passing request (S8447, S8448), the TV performs the same processing as in the video get mode of the mobile AV terminal. In the case where such information is not included in the video passing request, the TV displays an information error screen (S8449).

The following variation of this embodiment is possible.

Though this embodiment describes the case where video information is included in the video passing response received by the receiving unit 8080 from the TV 1 (45), the present invention is not limited to such. A video reproduction delay time between the video server and the TV may be included in the video passing response.

The use of the video reproduction delay time reduces a difference in reproduction position from the TV 1 (45) when video reproduction is passed to the mobile AV terminal 8006, which contributes to more seamless video reproduction passing.

The following describes a structure in which the video reproduction delay time is included in the video passing response in this embodiment.

Figure 103:
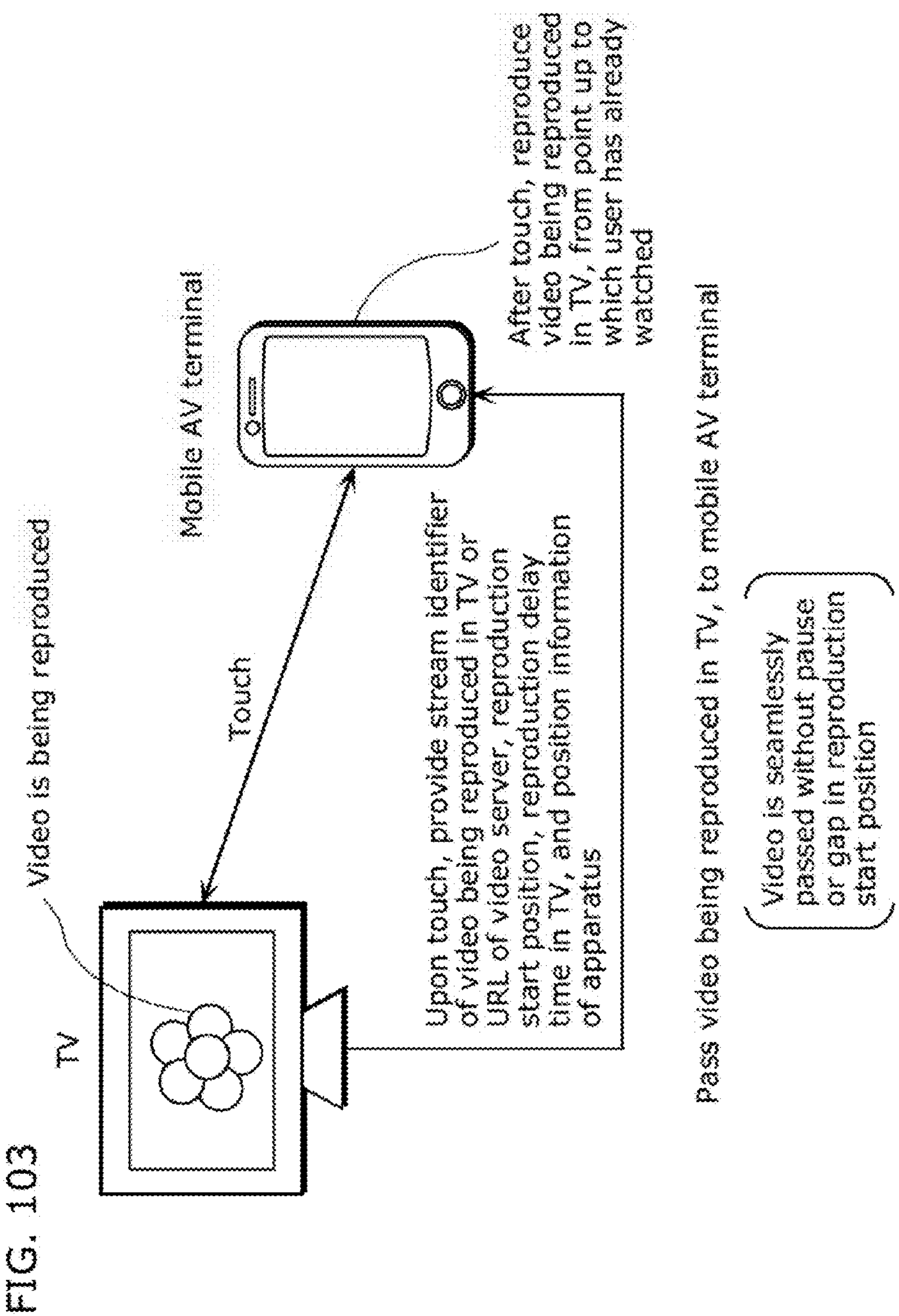
FIG. 103 is a schematic diagram in the case where video being reproduced in a TV is passed to a mobile AV terminal.
Figure 104:
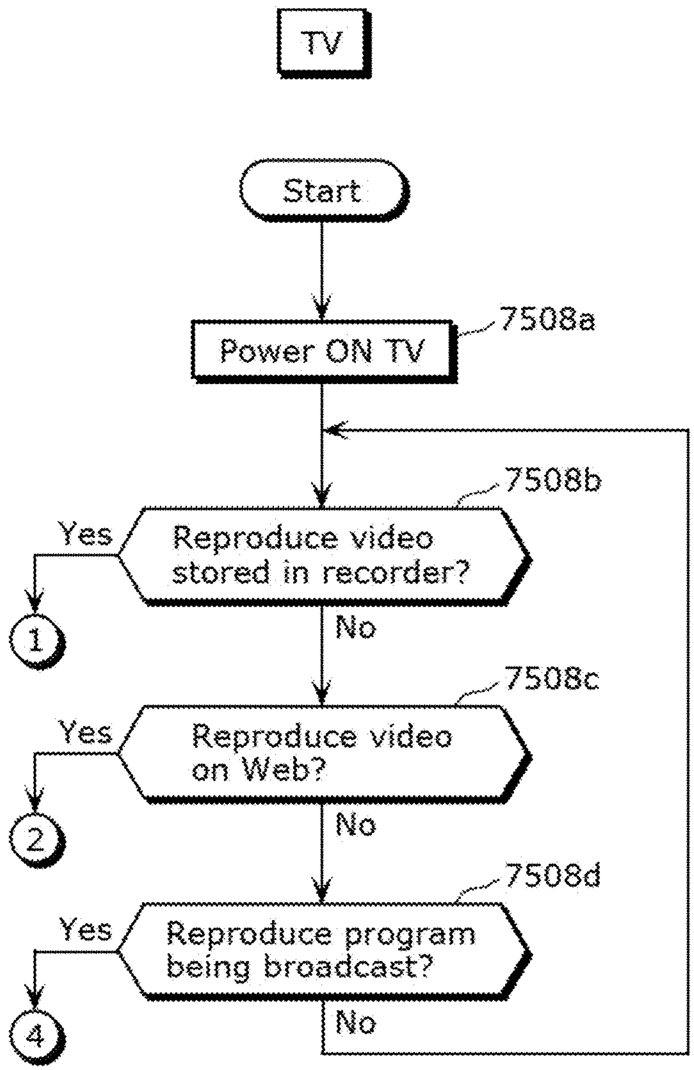
FIG. 104 is a diagram for explaining a procedure of passing video reproduction from the TV to the mobile AV terminal by NFC.
Figure 105:
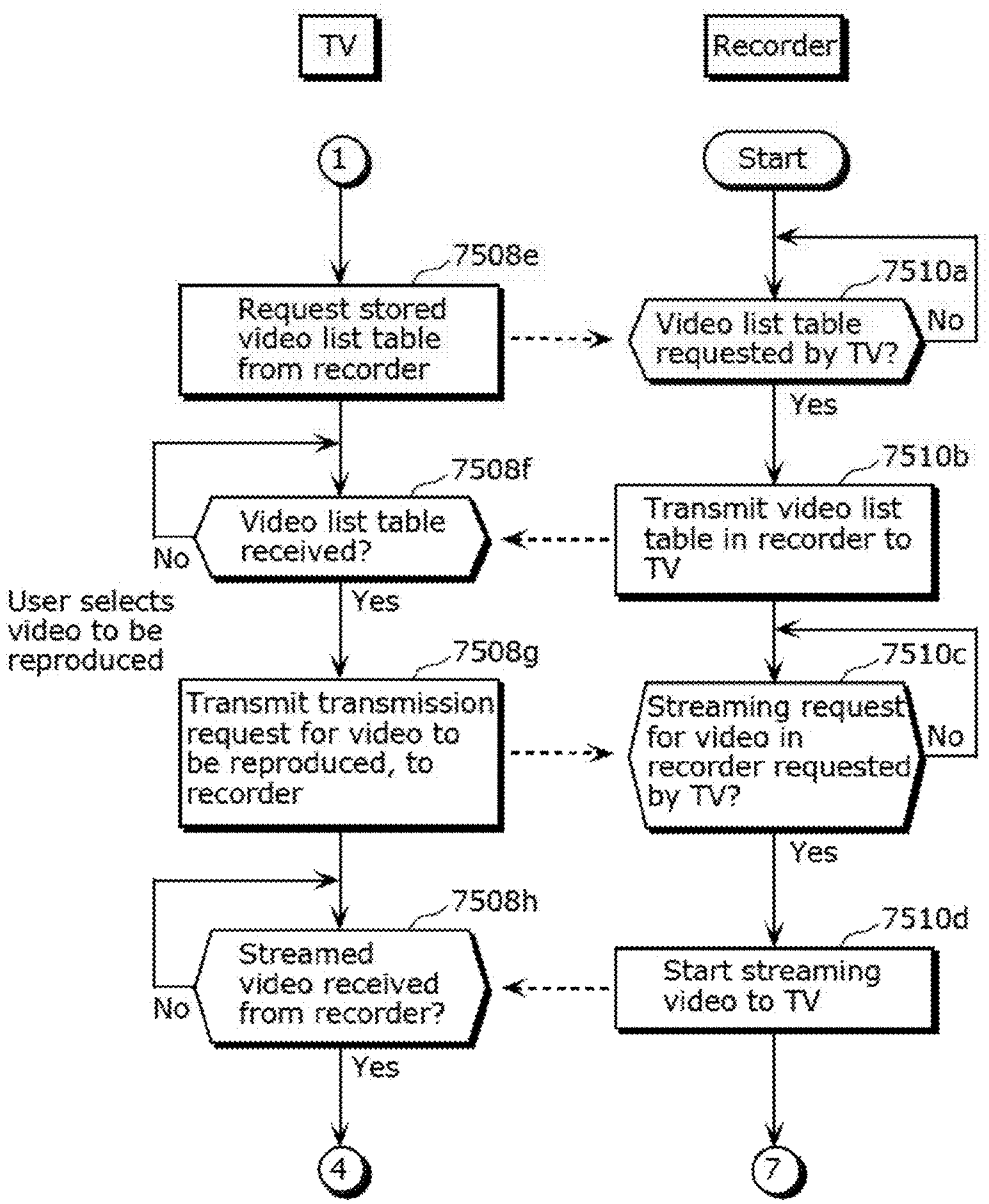
FIG. 105 is a diagram for explaining the procedure of passing video reproduction from the TV to the mobile AV terminal by NFC.
Figure 106:
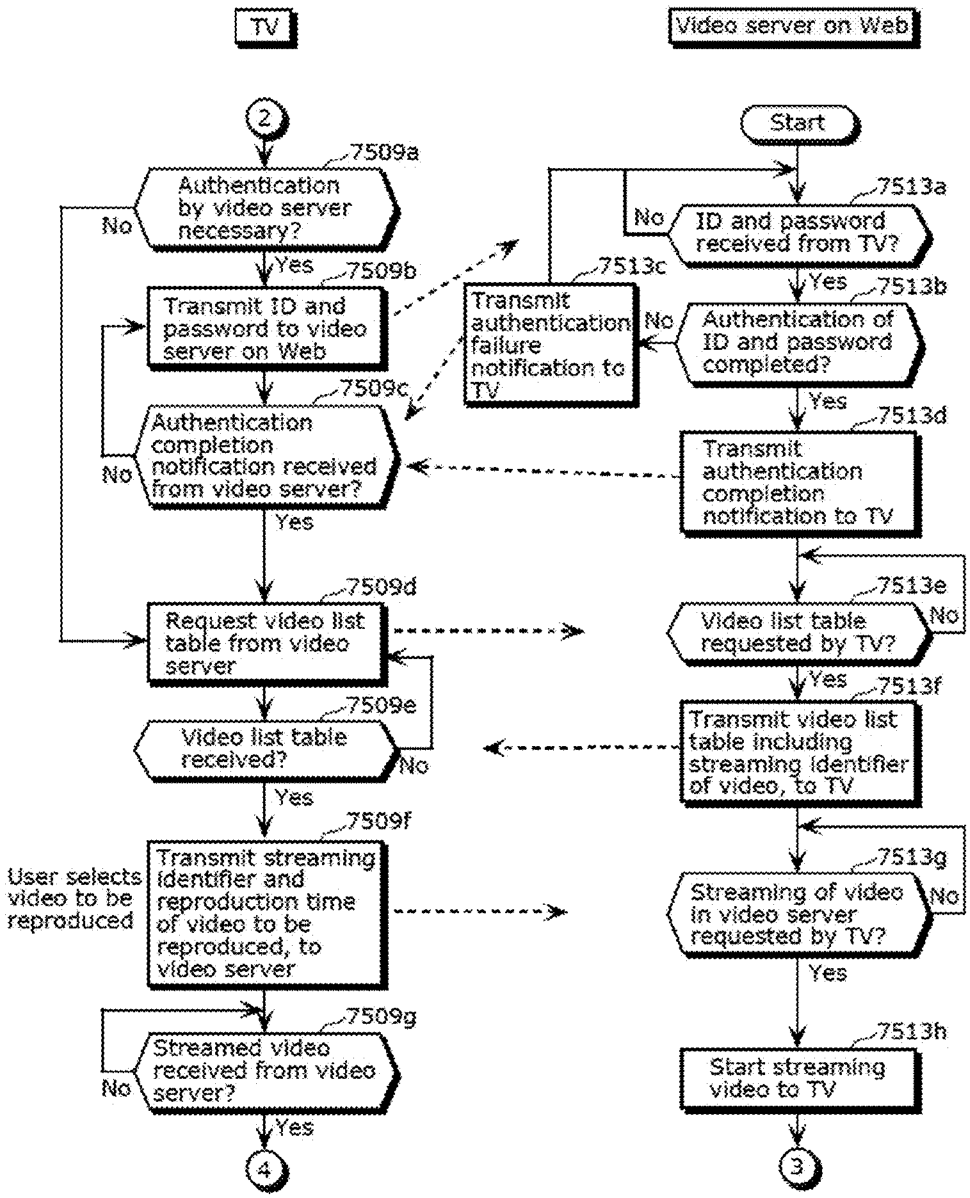
FIG. 106 is a diagram for explaining the procedure of passing video reproduction from the TV to the mobile AV terminal by NFC.
Figure 107:
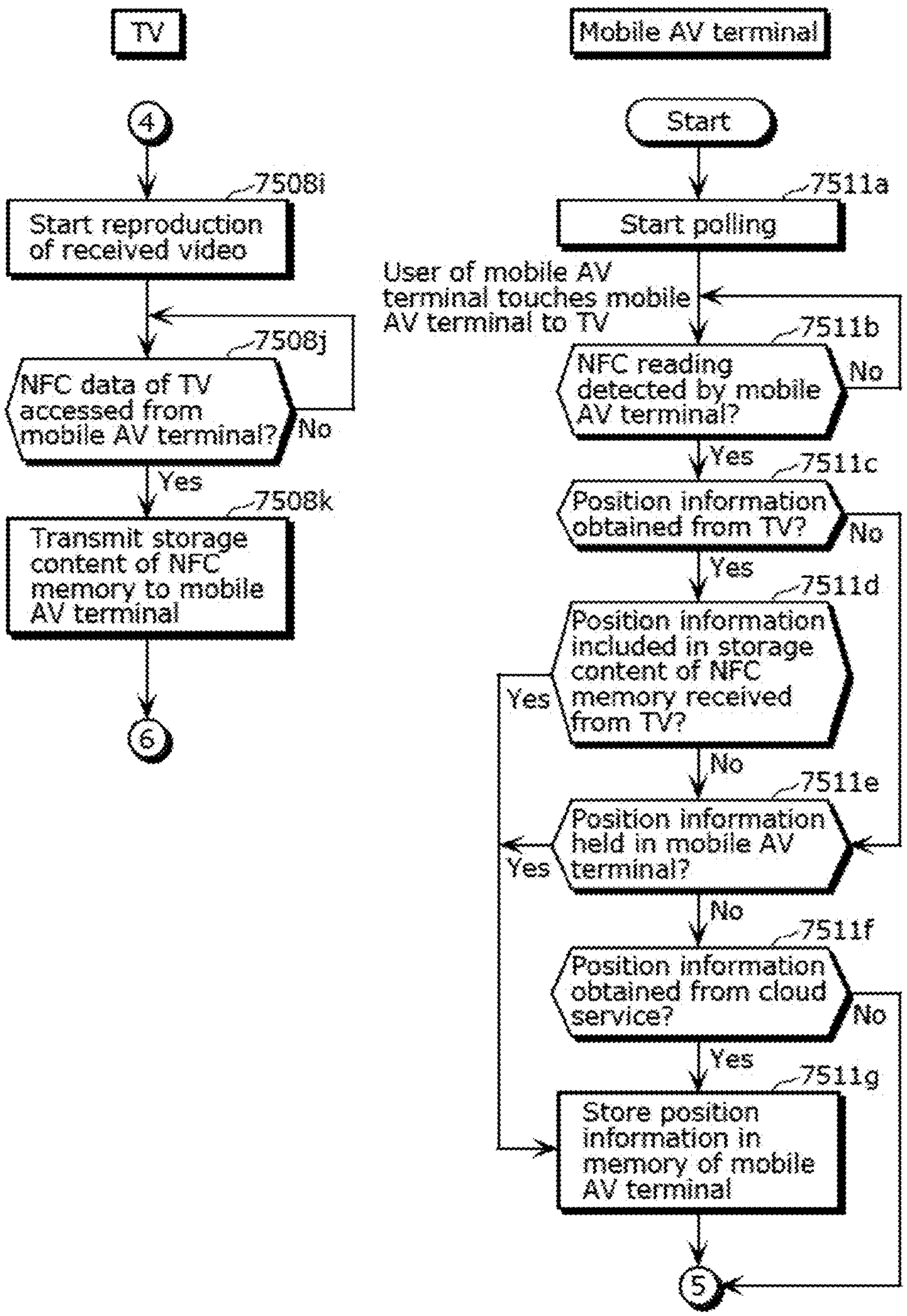
FIG. 107 is a diagram for explaining the procedure of passing video reproduction from the TV to the mobile AV terminal by NFC.
Figure 108:
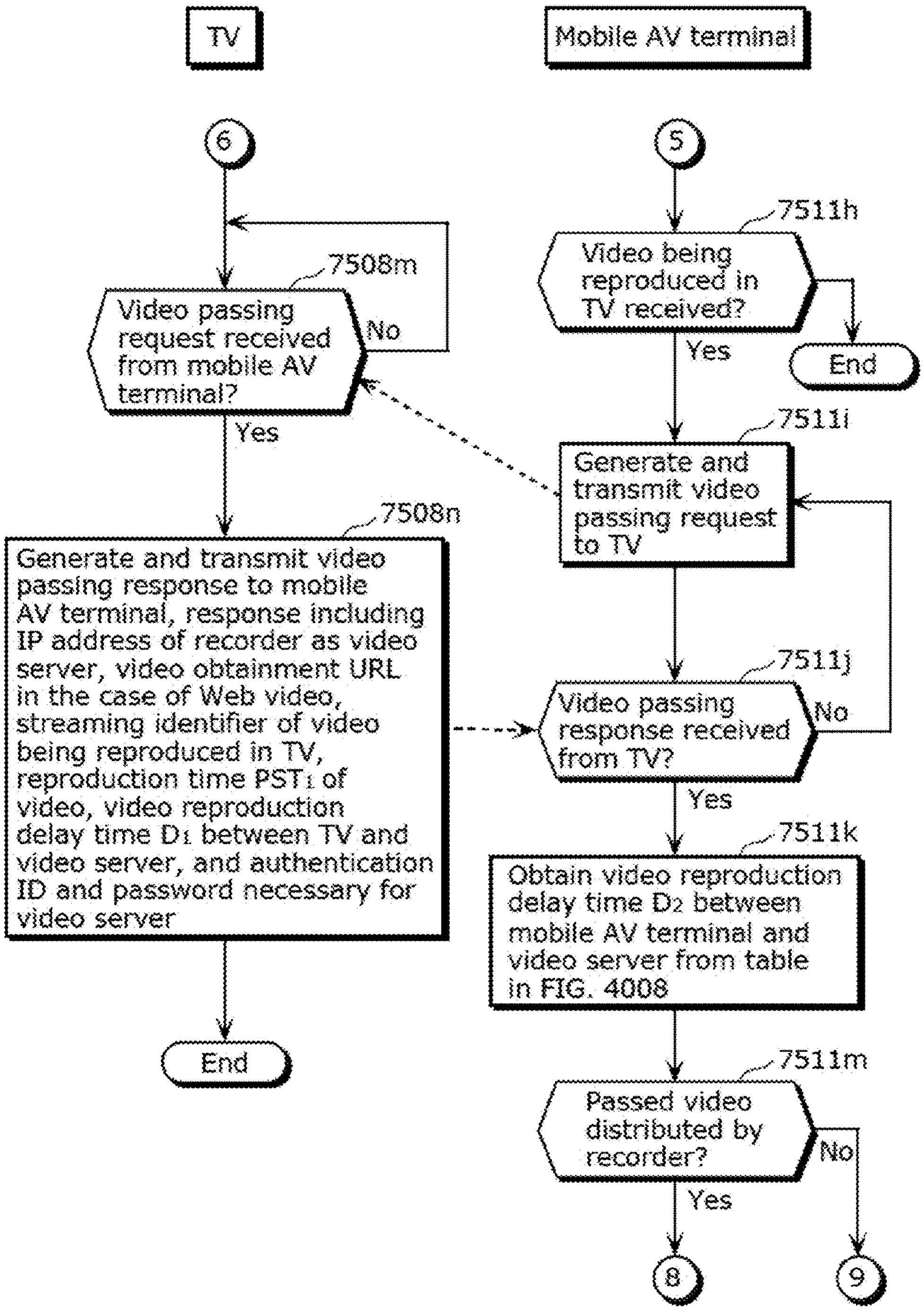
FIG. 108 is a diagram for explaining the procedure of passing video reproduction from the TV to the mobile AV terminal by NFC.
Figure 109:
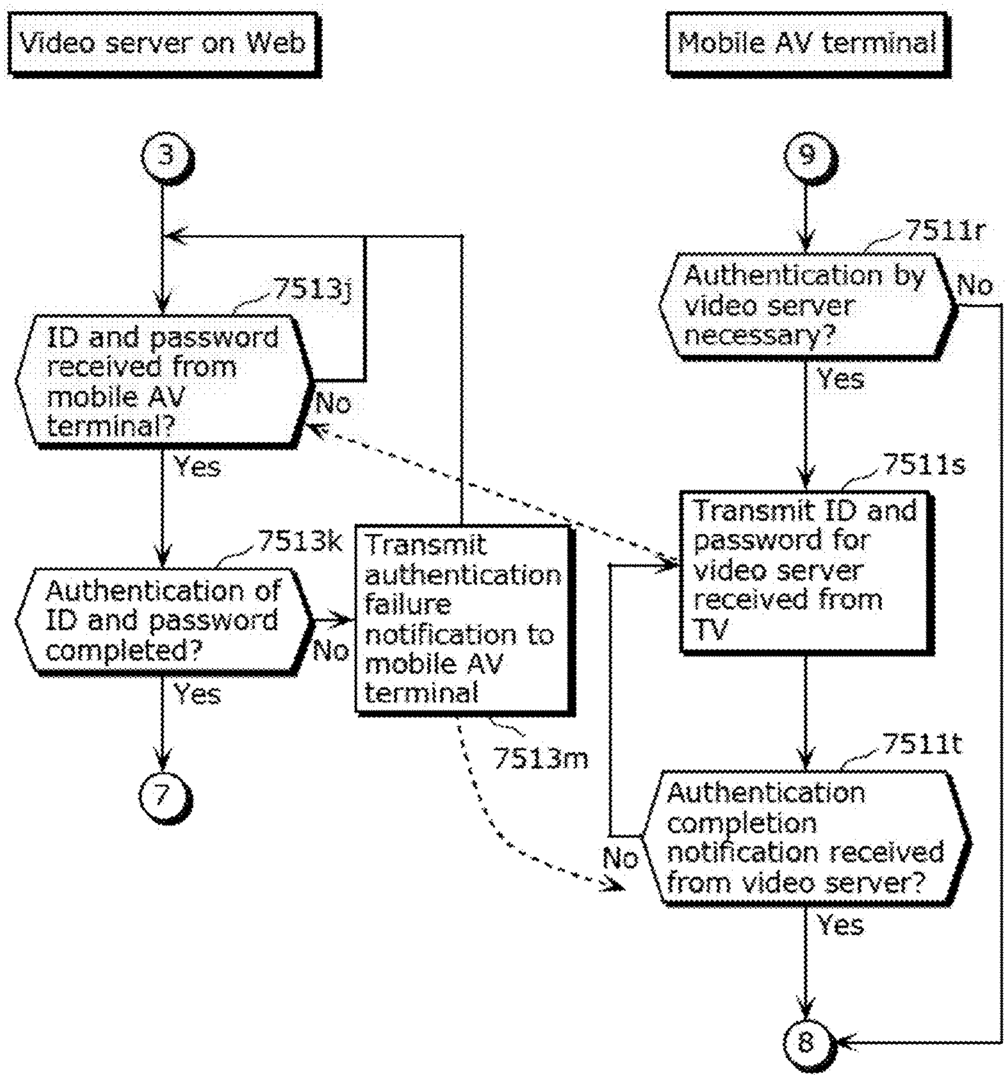
FIG. 109 is a diagram for explaining the procedure of passing video reproduction from the TV to the mobile AV terminal by NFC.
Figure 110:
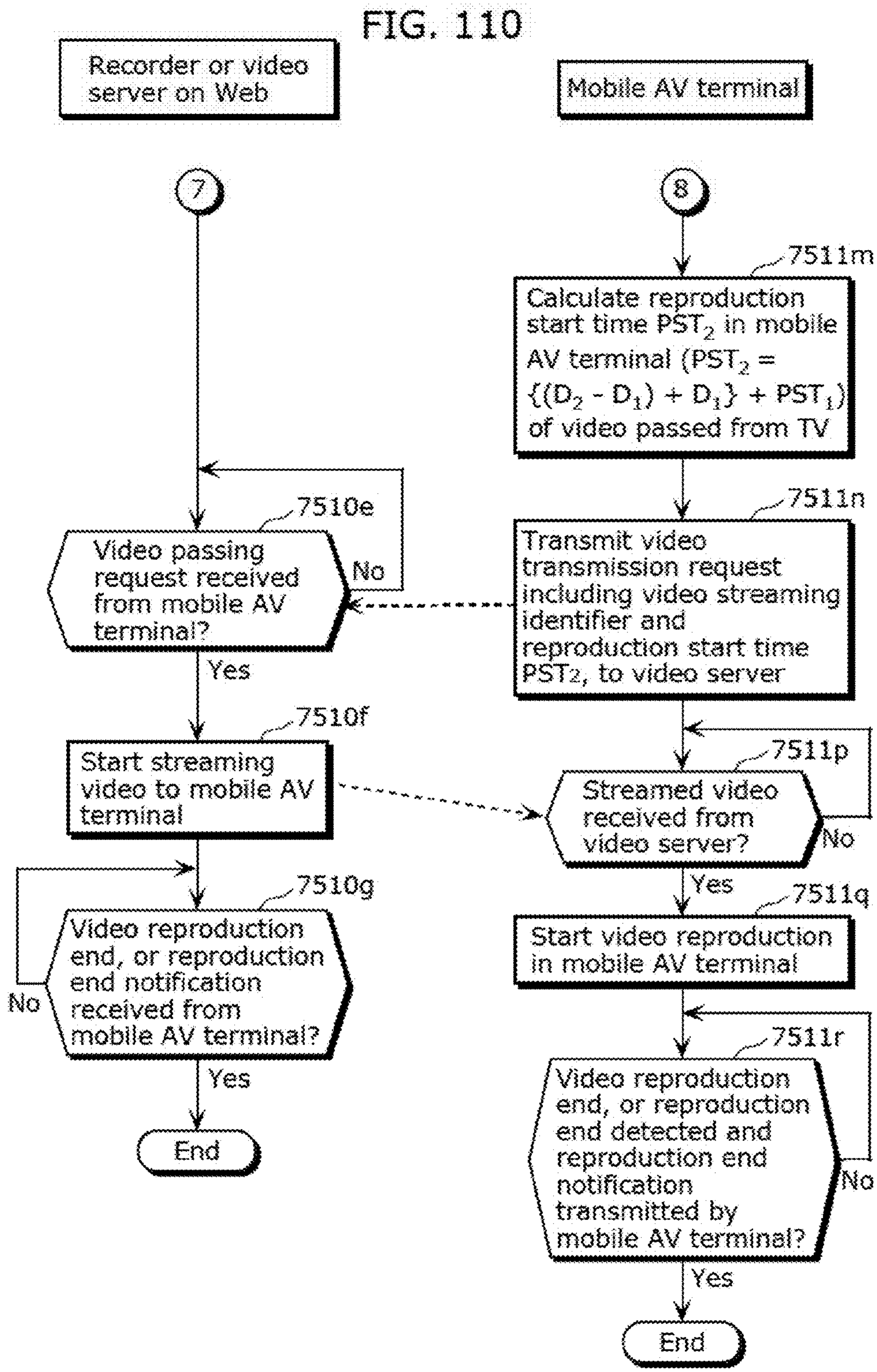
FIG. 110 is a diagram for explaining the procedure of passing video reproduction from the TV to the mobile AV terminal by NFC.

FIG. 103 is a schematic diagram showing a situation where video being reproduced in the TV is passed to the mobile AV terminal.

A procedure of passing video reproduction from the TV to the mobile AV terminal by NFC is described below, with reference to FIGS. 104 to 110.

In Step 7508*a*, the user operates a remote controller or the like or the mobile AV terminal held by the user detects the position of the mobile AV terminal to automatically power ON the TV.

In Step 7508*b*, the TV determines whether or not to reproduce video stored in a recorder. In the case where the determination in Step 7508*b* results in Yes, the TV proceeds to Circle 1.

In the case where the determination in Step 7508*b* results in No, the TV proceeds to Step 7508*c* to determine whether or not to reproduce video on the Web. In the case where the determination in Step 7508*c* results in Yes, the TV proceeds to Circle 2.

In the case where the determination in Step 7508*c* results in No, the TV proceeds to Step 7508*d* to determine whether or not to reproduce a program being broadcast. In the case where the determination in Step 7508*d* results in Yes, the TV proceeds to Circle 4. In the case where the determination in Step 7508*d* results in No, the TV returns to Step 7508*b*.

In Step 7508*e* from Circle 1, the TV requests the recorder to provide a video list table of stored video. In Step 7508*f*, the TV determines whether or not the video list table is received.

In the case where the determination in Step 7508*f* results in Yes, the TV proceeds to Step 7508*g* to transmit, to the recorder, a transmission request for video to be reproduced. The video to be reproduced is specified by the user selecting, on the screen, video which he or she wants to reproduce.

In the case where the determination in Step 7508*f* results in No, the TV waits until the video list table is transmitted from the recorder.

In Step 7508*h*, the TV determines whether or not the recorder starts streaming the video requested in Step 7508*g* and the TV starts receiving the video. In the case where the determination in Step 7508*h* results in Yes, the TV proceeds to Circle 4.

In the case where the determination in Step 7508*h* results in No, the TV waits until the reception of the streamed video starts.

In Step 7510*a*, the recorder determines whether or not the video list table is requested by the TV. In the case where the determination in Step 7510*a* results in Yes, the recorder proceeds to Step 7510*b* to transmit the video list table of video stored in the recorder to the TV.

In Step 7510*c*, the recorder determines whether or not the streaming of the video stored in the recorder is requested by the TV. In the case where the determination in Step 7510*c* results in Yes, the recorder proceeds to Step 7510*d* to start streaming the video to the TV. The recorder then proceeds to Circle 7.

In the case where the determination in Step 7510*a* results in No, the recorder waits until the video list table is requested by the TV. In the case where the determination in Step 7510*c* results in No, the recorder waits until the streaming of the video is requested by the TV.

In Step 7509*a* from Circle 2, the TV determines whether or not authentication is necessary to access a video server on the Web. In the case where the determination in Step 7509*a* results in Yes, the TV proceeds to Step 7509*b* to transmit an ID and a password to the video server on the Web. In the case where the determination in Step 7509*a* results in No, the TV proceeds to Step 7509*d* as the authentication by the video server is unnecessary.

In Step 7509*c*, the TV determines whether or not an authentication completion notification is received from the video server. In the case where the determination in Step 7509*c* results in Yes, the TV proceeds to Step 7509*d* to request the video server to provide a video list table. In the case where the determination in Step 7509*e* results in No, the TV returns to Step 7509*d* to perform the process of authentication by the video server again, as an authentication failure notification is received from the video server.

In Step 7509*e*, the TV determines whether or not the video list table is received. In the case where the determination in Step 7509*e* results in Yes, the TV proceeds to Step 7509*f* to transmit, to the video server, a streaming identifier and a reproduction time of video to be reproduced. The video to be reproduced is selected by the user from the video list table displayed on the screen.

In Step 7509*g*, the TV determines whether or not the TV starts receiving the streamed video from the video server. In the case where the determination in Step 7509*g* results in Yes, the TV proceeds to Circle 4. In the case where the determination in Step 7509*g* results in No, the TV waits until the streaming of the video from the video server starts.

In Step 7513*a*, the video server on the Web determines whether or not the ID and the password are received from the TV. In the case where the determination in Step 7513*a* results in Yes, the video server proceeds to Step 7513*b* to determine whether or not the ID and the password received from the TV are verified for authentication. In the case where the determination in Step 7513*b* results in Yes, the video server proceeds to Step 7513*d* to transmit the authentication completion notification to the TV. In the case where the determination in Step 7513*a* results in No, the video server waits until the ID and the password are received from the TV in Step 7513*a*. In the case where the determination in Step 7513*b* results in No, the video server proceeds to Step 7513*c* to transmit the authentication failure notification to the TV. The video server then returns to Step 7513*a*.

In Step 7513*e*, the video server determines whether or not the video list table is requested by the TV. In the case where the determination in Step 7513*e* results in Yes, the video server transmits the video list table of video held in the video server on the Web, to the TV. The video list table includes a streaming identifier of each set of video. In the case where the determination in Step 7513*e* results in No, the video server waits until the video list table is requested by the TV.

In Step 7513*g*, the video server determines whether or not the streaming of the video held in the video server is requested by the TV. In the case where the determination in Step 7513*g* results in Yes, the video server proceeds to Step 7513*h* to start streaming the video to the TV. The video server then proceeds to Circle 3. In the case where the determination in Step 7513*g* results in No, the video server waits until the streaming of the video held in the video server is requested by the TV.

In Step 7508*i* from Circle 4, the TV starts reproducing the received video. In Step 7508*j*, the TV determines whether or not the mobile AV terminal accesses NFC data in the TV. In the case where the determination in Step 7508*j* results in Yes, the TV proceeds to Step 7508*k* to transmit storage content of an NFC memory in the TV to the mobile AV terminal. The TV then proceeds to Circle 6. In the case where the determination in Step 7508*j* results in No, the TV waits until the mobile AV terminal accesses NFC data in the TV. An apparatus (appliance, device) ID and position information of the TV are stored in the NFC memory in the TV.

In Step 7511*a*, the mobile AV terminal starts polling for reading NFC data in the TV. In Step 7511*b*, the mobile AV terminal determines whether or not NFC reading is detected, as a result of the user of the mobile AV terminal touching the mobile AV terminal to the TV. In the case where the determination in Step 7511*b* results in Yes, the mobile AV terminal proceeds to Step 7511*c*. In the case where the determination in Step 7511*b* results in No, the mobile AV terminal waits until NFC reading is detected as a result of the user of the mobile AV terminal touching the mobile AV terminal to the TV.

In Step 7511*c*, the mobile AV terminal determines whether or not to obtain, from the TV, the position information of the TV held in the TV. In the case where the determination in Step 7511*c* results in Yes, the mobile AV terminal determines whether or not the position information is included in the storage content of the NFC memory received from the TV in Step 7511*d*. In the case where the determination in Step 7511*d* results in Yes, the mobile AV terminal proceeds to Step 7511*g* to store the position information in a memory of the mobile AV terminal. The mobile AV terminal then proceeds to Circle 5. In the case where the determination in Step 7511*c* results in No, the TV does not hold the position information, and so the mobile AV terminal proceeds to Step 7511*e* to determine whether or not the mobile AV terminal holds the position information. In the case where the determination in Step 7511*e* results in Yes, the mobile AV terminal proceeds to Step 7511*g*. In the case where the determination in Step 7511*e* results in No, the mobile AV terminal proceeds to Step 7511*f* to determine whether or not the position information can be obtained from a cloud service. In the case where the determination in Step 7511*f* results in Yes, the mobile AV terminal obtains the position information of the TV from a known cloud service based on the apparatus (appliance, device) ID of the TV. The mobile AV terminal then proceeds to Step 7511*g*. In the case where the determination in Step 7511*f* results in No, the mobile AV terminal proceeds to Circle 5.

In the case where the obtainment of the position information in Step 7511*e* or 7511*f* takes time and so Step 7511*g* cannot be performed, the procedure may proceed in such a manner that the steps from Circle 5 are performed before these steps and then the obtainment of the position information and Step 7511*g* are performed.

In Step 7508*m* from Circle 6, the TV determines whether or not a video passing request is received from the mobile AV terminal. In the case where the determination in Step 7508*m* results in Yes, the TV proceeds to Step 7508*n* to generate a video passing response and transmit the video passing response to the mobile AV terminal. The video passing response transmitted to the mobile AV terminal includes: an IP address of the recorder as the video server; a URL for video obtainment in the case of Web video; a streaming identifier of video being reproduced in the TV; a reproduction time PST1 of the video; a video reproduction delay time D1 between the TV and the video server; and an authentication ID and password necessary for accessing the video server. In the case where the determination in Step 7508*m* results in No, the TV waits until the video passing request is received from the mobile AV terminal.

In Step 7511*h* from Circle 5, the mobile AV terminal determines whether or not to receive the video being reproduced in the TV. In the case where the determination in Step 7511*h* results in Yes, the mobile AV terminal proceeds to Step 7511*i* to generate the video passing request and transmit the video passing request to the TV. Following this, in Step 7511*j*, the mobile AV terminal determines whether or not the video passing response is received from the TV. In the case where the determination in Step 7511*j* results in Yes, the mobile AV terminal proceeds to Step 7511*k*.

The mobile AV terminal obtains a video reproduction delay time D2 between the mobile AV terminal and the video server, from a table in FIG. 4016. In Step 7511*m*, the mobile AV terminal determines whether or not the video to be passed is distributed by the recorder. In the case where the determination in Step 7511*m* results in Yes, the mobile AV terminal proceeds to Circle 8. In the case where the determination in Step 7511*h* results in No, the mobile AV terminal ends the procedure without video passing. Note that a network delay, a delay due to execution states of transmission and reception apparatuses, a delay due to performance of transmission and reception apparatuses, a delay due to processing depending on received video format, and the like may also be taken into consideration in the delay time calculation method.

In the case where the determination in Step 7511*j* results in No, the mobile AV terminal returns to Step 7511*i* to generate the video passing request and transmit the video passing request to the TV again. In the case where the determination in Step 7511*m* results in No, the mobile AV terminal proceeds to Circle 9.

In Step 7511*r* from Circle 9, the mobile AV terminal determines whether or not authentication by the video server is necessary. In the case where the determination in Step 7511*r* results in Yes, the mobile AV terminal proceeds to Step 7511*s* to transmit the authentication ID and password for the video server received from the TV. In the case where the determination in Step 7511*r* results in No, the mobile AV terminal proceeds to Circle 8 without the process of authentication by the video server.

In Step 7511*t*, the mobile AV terminal determines whether or not an authentication completion notification is received from the video server. In the case where the determination in Step 7511*t* results in Yes, the mobile AV terminal proceeds to Circle 8. In the case where the determination in Step 7511*t* results in No, the mobile AV terminal returns to Step 7511*s* to perform the process of authentication by the video server again.

In Step 7513*j* from Circle 3, the video server on the Web determines whether or not the authentication ID and the password are received from the mobile AV terminal. In the case where the determination in Step 7513*j* results in Yes, the video server proceeds to Step 7513*k* to determine whether or not the ID and the password received from the mobile AV terminal are authenticated. In the case where the determination in Step 7513*k* results in Yes, i.e. in the case of authenticating the ID and the password, the video server proceeds to Circle 7. In the case where the determination in Step 7513*j* results in No, the video server waits until the authentication ID and the password are received from the mobile AV terminal in Step 7513*j*. In the case where the determination in Step 7513*k* results in No, the video server proceeds to Step 7513*m* to transmit an authentication failure notification to the mobile AV terminal. The video server then returns to Step 7513*j* to wait until the authentication ID and the password are received from the mobile AV terminal.

In Step 7510*e* from Circle 7, the recorder or the video server on the Web determines whether or not a video passing request is received from the mobile AV terminal. In the case where the determination in Step 7510*e* results in Yes, the recorder or the video server proceeds to Step 7510*f* to start streaming the video to the mobile AV terminal. In the case where the determination in Step 7510*e* results in No, the recorder or the video server waits until the video passing request is received from the mobile AV terminal in Step 7510*e*.

In Step 7510*g*, the recorder or the video server determines whether or not the video being reproduced ends or whether or not a reproduction end notification is received from the mobile AV terminal. In the case where the determination in Step 7510*g* results in Yes, the recorder or the video server stops the process of video streaming to the mobile AV terminal, thus ending the procedure. In the case where the determination in Step 7510*g* results in No, the recorder or the video server continues the video reproduction until the video being reproduced ends or the reproduction end notification is received from the mobile AV terminal.

In Step 7511*m* from Circle 8, the mobile AV terminal calculates a reproduction start time PST2 in the mobile AV terminal (PST2={(D2−D1)+D1}+PST1) of the video passed from the TV. In Step 7511*n*, the mobile AV terminal transmits a video transmission request to the video server (the recorder or the video server on the Web). The request includes the video streaming identifier and the reproduction start time PST2.

In Step 7511*p*, the mobile AV terminal determines whether or not the streamed video is received from the video server. In the case where the determination in Step 7511*p* results in Yes, the mobile AV terminal proceeds to Step 7511*q* to start reproducing the video. In the case where the determination in Step 7511*p* results in No, the mobile AV terminal waits until the streamed video is received from the video server.

In Step 7510*g*, the mobile AV terminal determines whether or not the video being reproduced ends or whether or not the mobile AV terminal transmits the reproduction end notification to the recorder or the video server on the Web. In the case where the determination in Step 7511*r* results in Yes, the mobile AV terminal ends the video reproduction. In the case where the determination in Step 7511*r* results in No, the mobile AV terminal continues the video reproduction until the video being reproduced ends or the mobile AV terminal detects the reproduction end.

Moreover, the following variation of this embodiment is possible.

Though this embodiment describes the case where the receiving unit 8080 receives the video passing response from the TV 1 (45) when the RFID tag reader/writers of the mobile AV terminal 8006 and the TV 1 (45) perform proximity wireless communication with each other, the present invention is not limited to this order.

Assuming that the mobile AV terminal 8006 recognizes the position of the mobile AV terminal 8006 and the position of the TV 1 (45), the mobile AV terminal 8006 may receive the video passing response in the case where the position of the mobile AV terminal 8006 is away from the position of the TV 1 (45) by a predetermined distance or more.

By enabling switching between video reproduction apparatuses in this way, the user can continue to view reproduced video on a terminal or an apparatus corresponding to the user's location. The obtainment of the position of each apparatus is only briefly described here, as its detailed description will be given in Embodiment 19. A video reproduction delay time between the video server and the TV 1 (45) or the mobile AV terminal 8006 may also be included in the video passing response transferred between the TV 1 (45) and the mobile AV terminal 8006. The use of the video reproduction delay time reduces a difference in reproduction start position when video reproduction is passed between the TV 1 (45) and the mobile AV terminal 8006, which contributes to more seamless video reproduction passing.

The following describes a structure involving such a video passing response in this embodiment.

Figure 111:
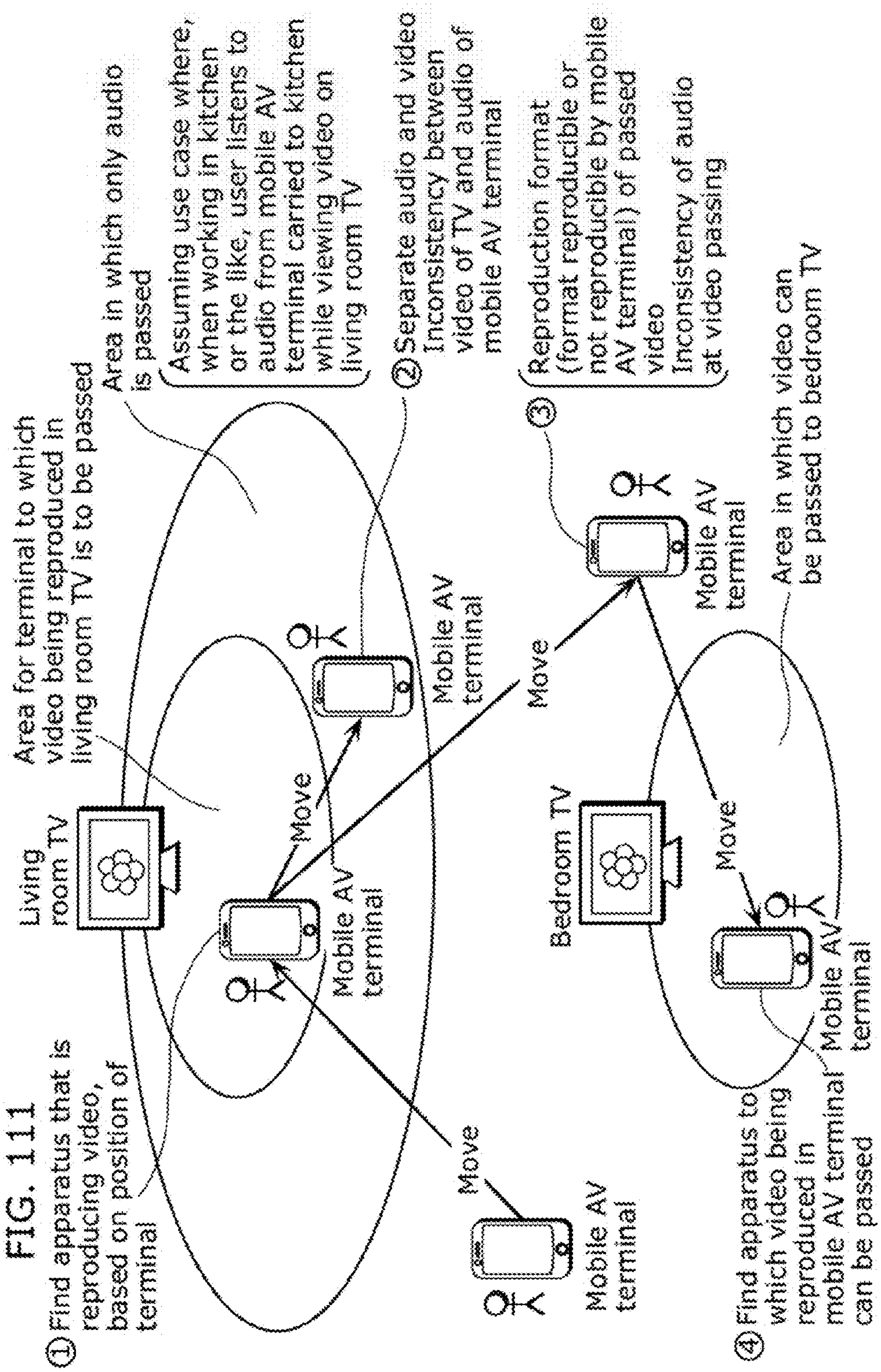
FIG. 111 is a schematic diagram showing reproduced video passing between the TV and the mobile AV terminal.
Figure 113:
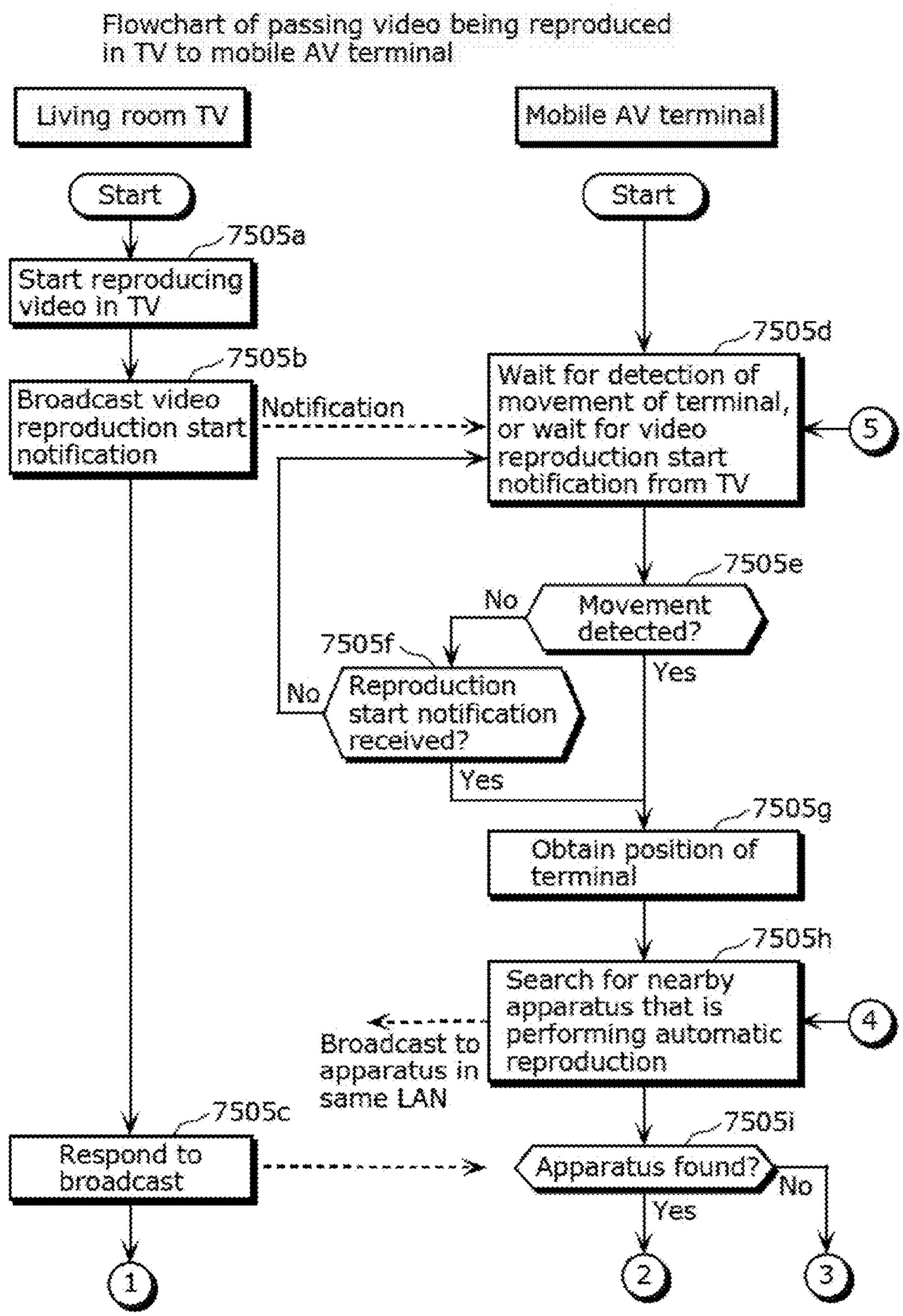
Figure 114:
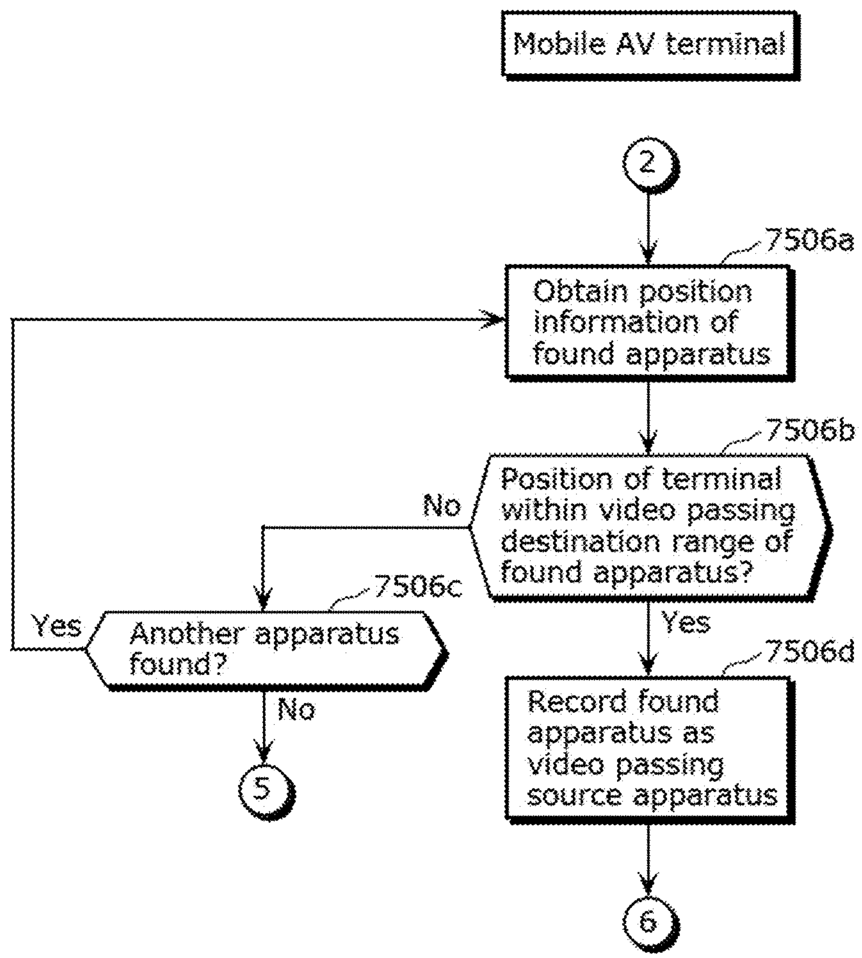
Figure 115:
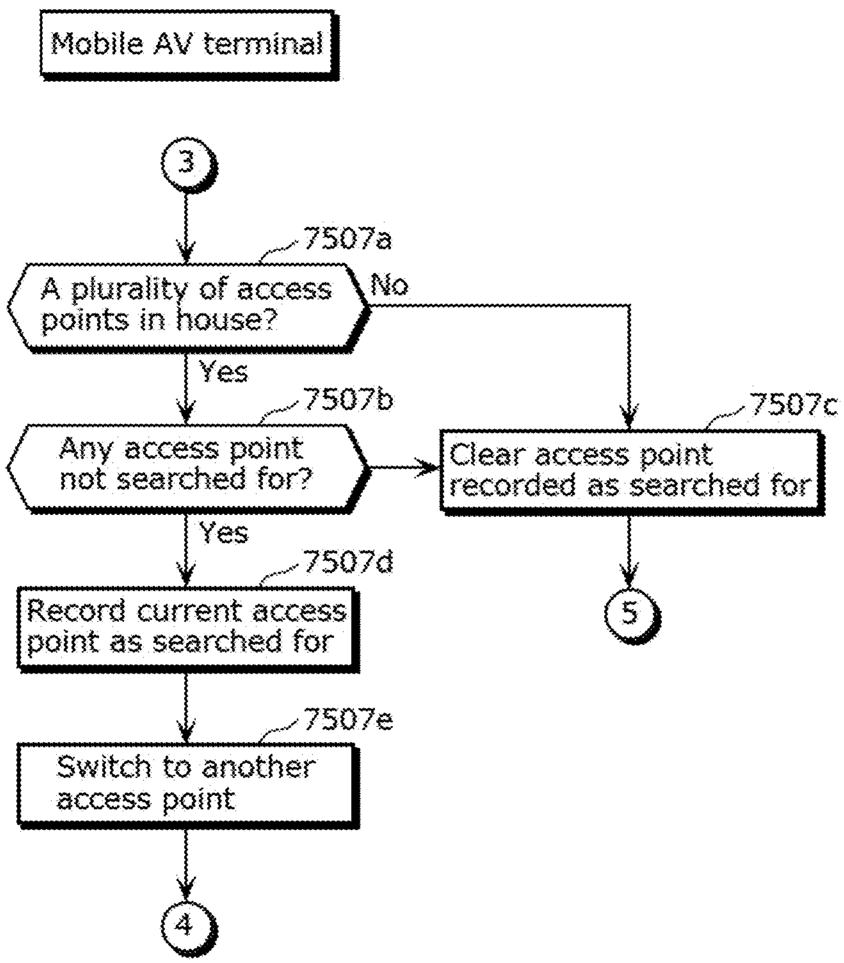
Figure 116:
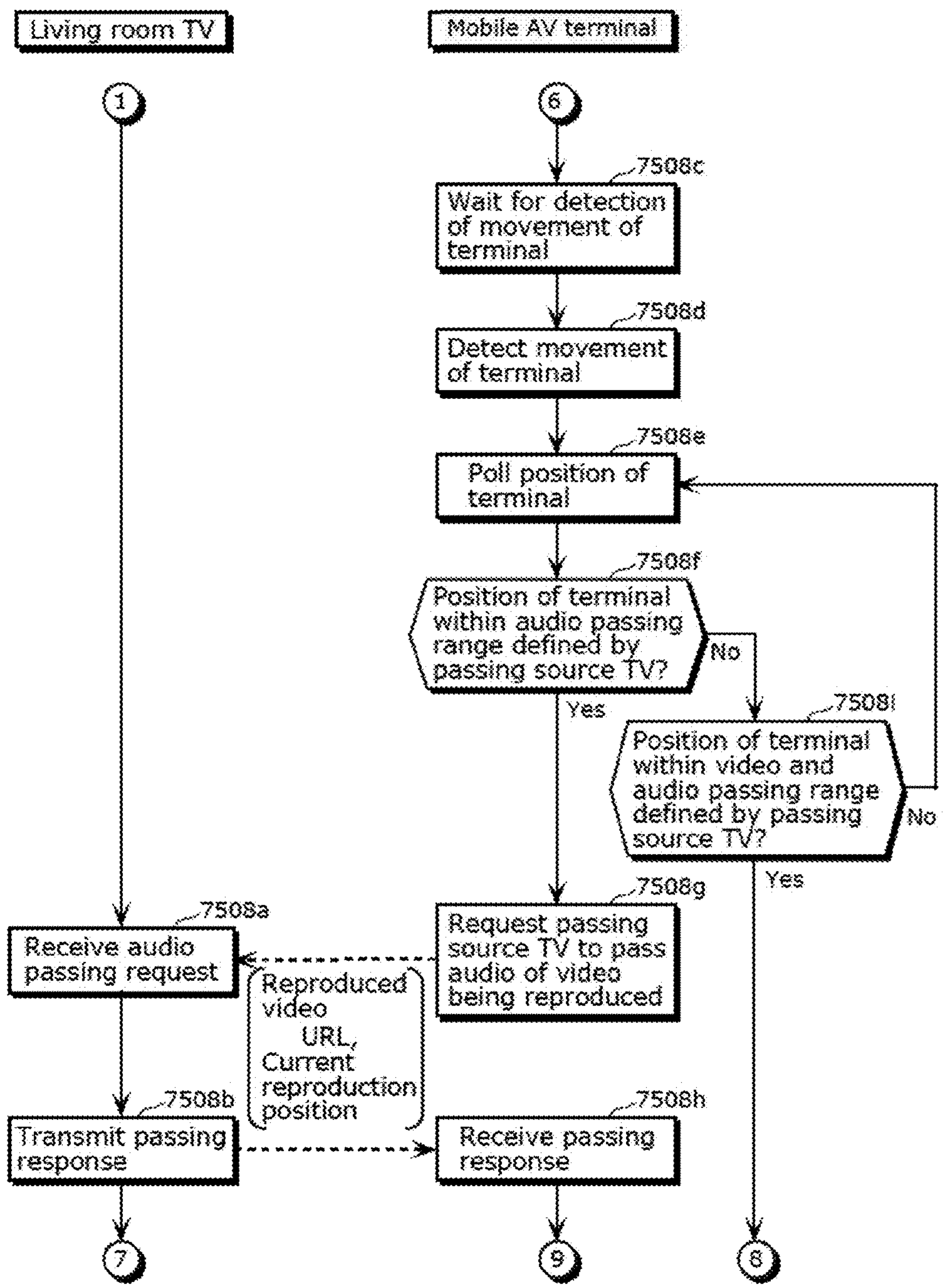
Figure 117:
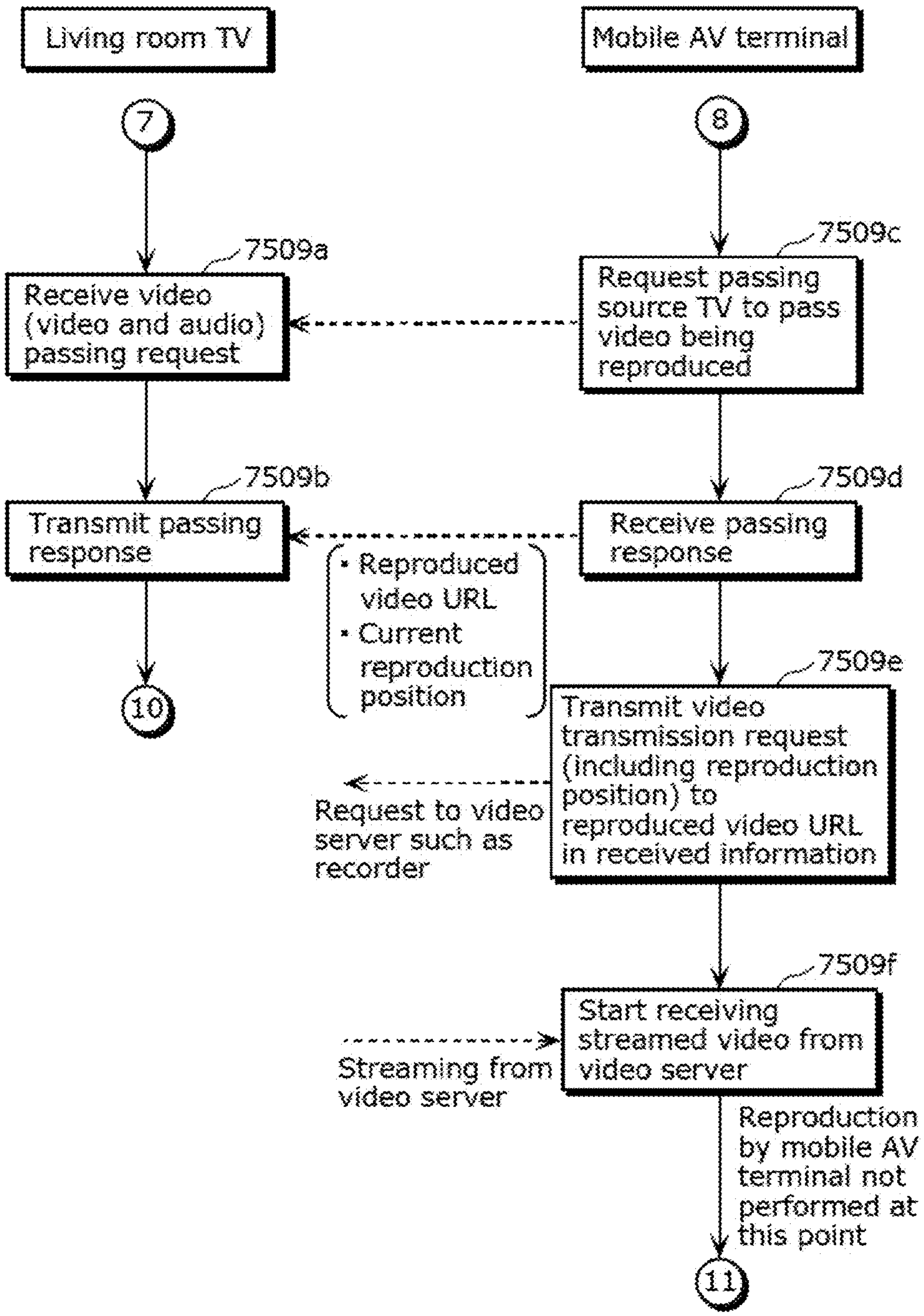
Figure 118:
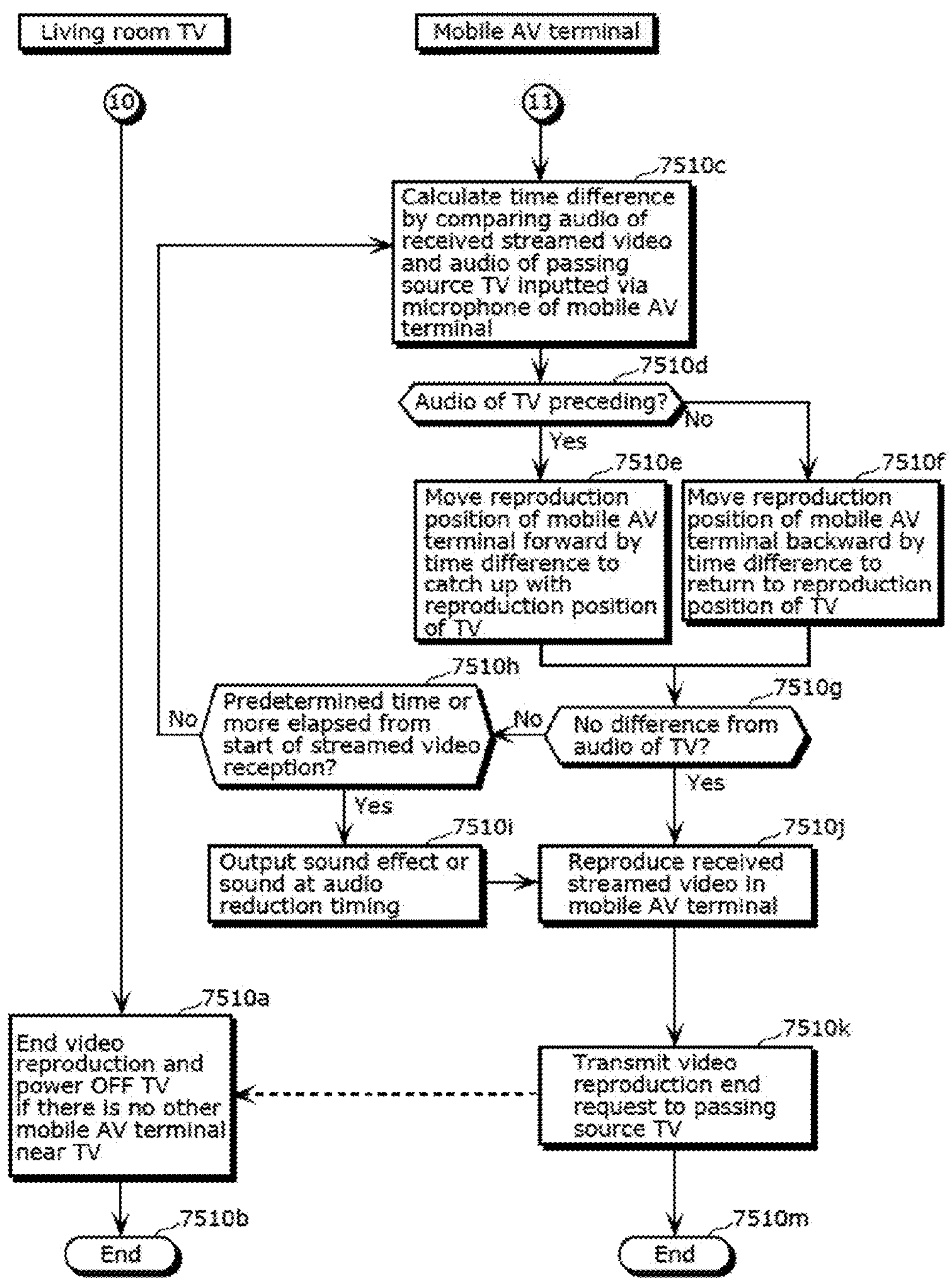

FIG. 111 is a schematic diagram showing passing of reproduced video between the TV and the mobile AV terminal. How the apparatus used for reproduction changes according to the position of the mobile AV terminal and which content (audio, video) is passed to each apparatus are shown in FIG. 111.

A procedure of passing video being reproduced in the TV to the mobile AV terminal is described below, with reference to FIGS. 113 to 118.

In Step 7505*a*, a living room TV starts reproducing video. In Step 7505*b*, the living room TV broadcasts a video reproduction start notification.

In Step 7505*c*, the living room TV returns a response to a broadcast from the mobile AV terminal. The living room TV then proceeds to Circle 1.

In Step 7505*d*, the mobile AV terminal waits for detecting movement of the mobile AV terminal or waits for receiving the video reproduction start notification from the TV. In Step 7505*e*, the mobile AV terminal determines whether or not the movement is detected. In the case where the determination in Step 7505*e* results in Yes, the mobile AV terminal proceeds to Step 7505*g* to obtain the position of the mobile AV terminal after the movement.

In the case where the determination in Step 7505*e* results in No, the mobile AV terminal proceeds to Step 7505*f* to determine whether or not the reproduction start notification is received. In the case where the determination in Step 7505*f* results in Yes, the mobile AV terminal proceeds to Step 7505*g* to obtain the position of the mobile AV terminal after the movement. In the case where the determination in Step 7505*f* results in No, the mobile AV terminal returns to Step 7505*d*.

In Step 7505*h*, the mobile AV terminal searches nearby apparatuses for an apparatus that is reproducing video.

In Step 7505*i*, the mobile AV terminal determines whether or not the apparatus reproducing the video is found. In the case where the determination in Step 7505*i* results in Yes, the mobile AV terminal proceeds to Circle 2. In the case where the determination in Step 7505*i* results in No, the mobile AV terminal proceeds to Circle 3.

In Step 7506*a* from Circle 2, the mobile AV terminal obtains position information of the found apparatus. As the apparatus finding method, not only broadcasting but also touching by proximity contact communication is available. Moreover, the position information of the found apparatus can be obtained by inquiring of the TV or a cloud service based on an apparatus ID included in the broadcast response transmitted from the TV in Step 7505*c*.

In Step 7506*b*, the mobile AV terminal determines whether or not the position of the mobile AV terminal is within a video passing destination range of the found apparatus. In the case where the determination in Step 7506*b* results in Yes, the mobile AV terminal proceeds to Step 7506*d* to record the found apparatus as a video passing source apparatus. The mobile AV terminal then proceeds to Circle 6. In the case where the determination in Step 7506*b* results in No, the mobile AV terminal proceeds to Step 7506*c* to determine whether or not another apparatus is found. In the case where the determination in Step 7506*c* results in Yes, the mobile AV terminal returns to Step 7506*a*. In the case where the determination in Step 7506*c* results in No, the mobile AV terminal proceeds to Circle 5.

In Step 7507*a* from Circle 3, the mobile AV terminal determines whether or not there are a plurality of access points in the house. In the case where the determination in Step 7507*a* results in Yes, the mobile AV terminal proceeds to Step 7507*b*.

In Step 7507*b*, the mobile AV terminal determines whether or not there is any access point not searched for. In the case where the determination in Step 7507*b* results in Yes, the mobile AV terminal proceeds to Step 7507*d* to record the current access point as already searched for. In Step 7507*e*, the mobile AV terminal switches to another access point. The mobile AV terminal then proceeds to Circle 4.

In the case where the determination in Step 7507*a* or 7507*b* results in No, the mobile AV terminal proceeds to Step 7507 to clear the access point recorded as already searched for. The mobile AV terminal then proceeds to Circle 5.

In Step 7508*a* from Circle 1, the living room TV receives an audio passing request. In Step 7508*b*, the living room TV transmits a passing response. The living room TV then proceeds to Circle 7.

In Step 7508*c* from Circle 6, the mobile AV terminal waits for detecting movement of the mobile AV terminal. In the case of detecting the movement of the mobile AV terminal in Step 7508*d*, the mobile AV terminal polls the position of the mobile AV terminal in Step 7508*e*. In Step 7508*f*, the mobile AV terminal determines whether or not the position of the mobile AV terminal is within an audio passing range defined by the passing source TV. In the case where the determination in Step 7508*f* results in Yes, the mobile AV terminal proceeds to Step 7508*g* to request the passing source TV to pass audio of the video being reproduced. In Step 7508*h*, the mobile AV terminal receives the passing response. The mobile AV terminal then proceeds to Circle 9.

In the case where the determination in Step 7508*f* results in No, the mobile AV terminal proceeds to Step 7508*i* to determine whether or not the position of the mobile AV terminal is within a video and audio passing range defined by the passing source TV.

In the case where the determination in Step 7508*i* results in Yes, the mobile AV terminal proceeds to Circle 8. In the case where the determination in Step 7508*i* results in No, the mobile AV terminal returns to Step 7508*e*.

In Step 7509*a* from Circle 7, the living room TV receives a video (video and audio) passing request. In Step 7509*b*, the living room TV transmits a passing response. The living room TV then proceeds to Circle 10.

In Step 7509*c* from Circle 8, the mobile AV terminal requests the passing source TV to pass the video being reproduced. In Step 7509*d*, the mobile AV terminal receives the passing response. In Step 7509*e*, the mobile AV terminal transmits a video transmission request (including a reproduction position) to a reproduced video URL in the received information. In Step 7509*f*, the mobile AV terminal starts receiving streamed video from a video server (the mobile AV terminal does not perform reproduction at this point). The mobile AV terminal then proceeds to Circle 11.

In Step 7510*a* from Circle 10, the TV ends video reproduction and is powered OFF if there is no other mobile AV terminal near the TV. In Step 7510*b*, the TV ends the procedure.

In Step 7510 from Circle 11, the mobile AV terminal compares audio of the received streamed video and audio of the passing source TV inputted via a microphone of the mobile AV terminal, to calculate their time difference. In Step 7510*d*, the mobile AV terminal determines whether or not the audio of the TV precedes the audio of the received streamed video.

In the case where the determination in Step 7510*d* results in Yes, the mobile AV terminal proceeds to Step 7510*e* to move the reproduction position of the mobile AV terminal forward by the time difference so as to catch up with the reproduction position of the TV. The mobile AV terminal then proceeds to Step 7510*g*. In the case where the determination in Step 7510*d* results in No, the mobile AV terminal proceeds to Step 7510*f* in which the mobile AV terminal moves the reproduction position of the mobile AV terminal backward by the time difference so as to return to the reproduction position of the TV. The mobile AV terminal then proceeds to Step 7510*g*.

In Step 7510*g*, the mobile AV terminal determines whether or not there is no difference from the audio of the TV. In the case where the determination in Step 7510*g* results in Yes, the mobile AV terminal proceeds to Step 7510*j* to reproduce the received streamed video. In Step 7510*k*, the mobile AV terminal transmits a video reproduction end request to the passing source TV. In Step 7510*m*, the mobile AV terminal ends the procedure.

In the case where the determination in Step 7510*g* results in No, the mobile AV terminal proceeds to Step 7510*h* to determine whether or not a predetermined time or more has elapsed from when the reception of the streamed video starts. In the case where the determination in Step 7510*h* results in Yes, the mobile AV terminal proceeds to Step 7510*i* to output sound effect or sound at audio reduction timing. The mobile AV terminal then proceeds to Step 7510*j*. In the case where the determination in Step 7510*h* results in No, the mobile AV terminal returns to Step 7510*c*.

Figure 119:
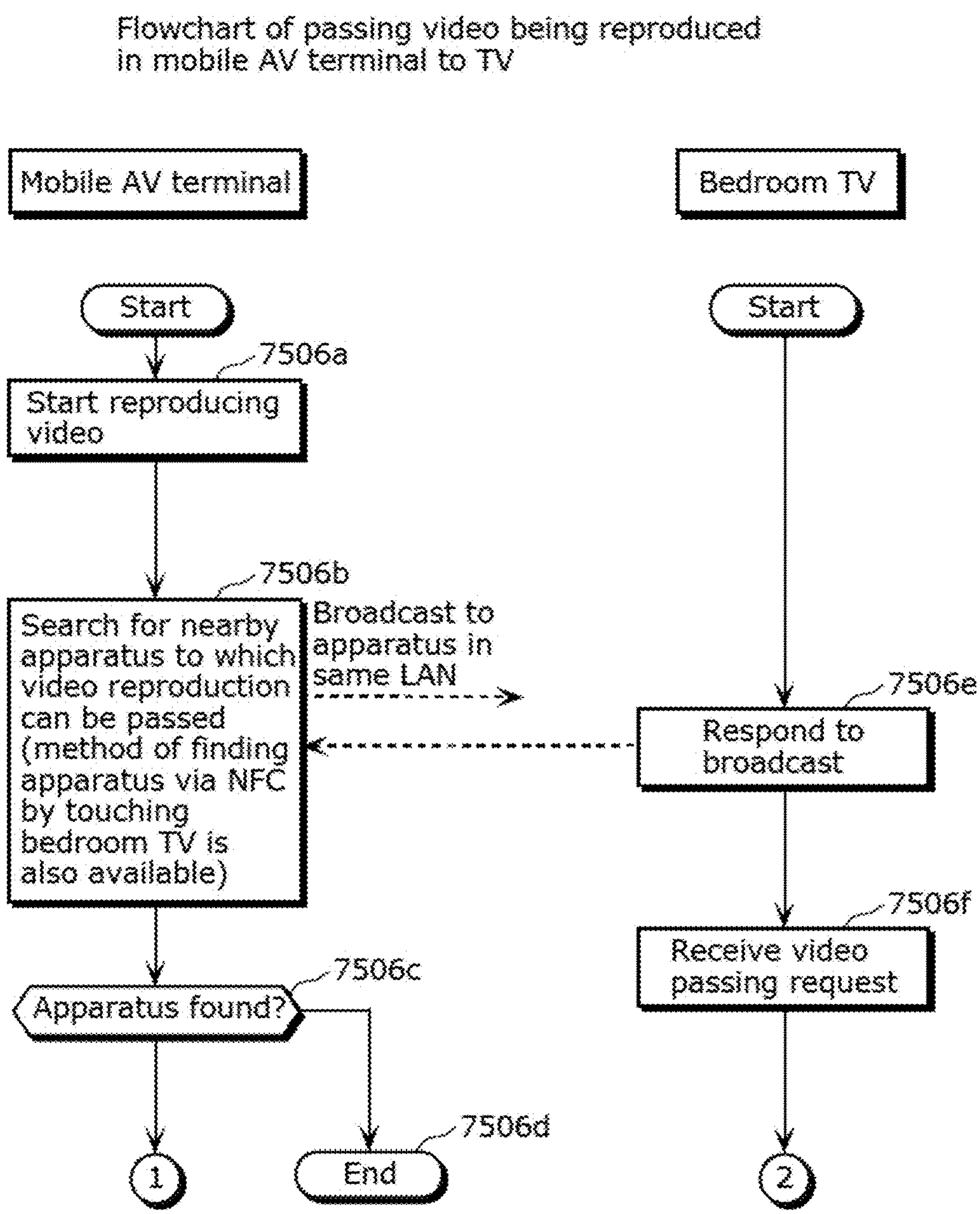
Figure 120:
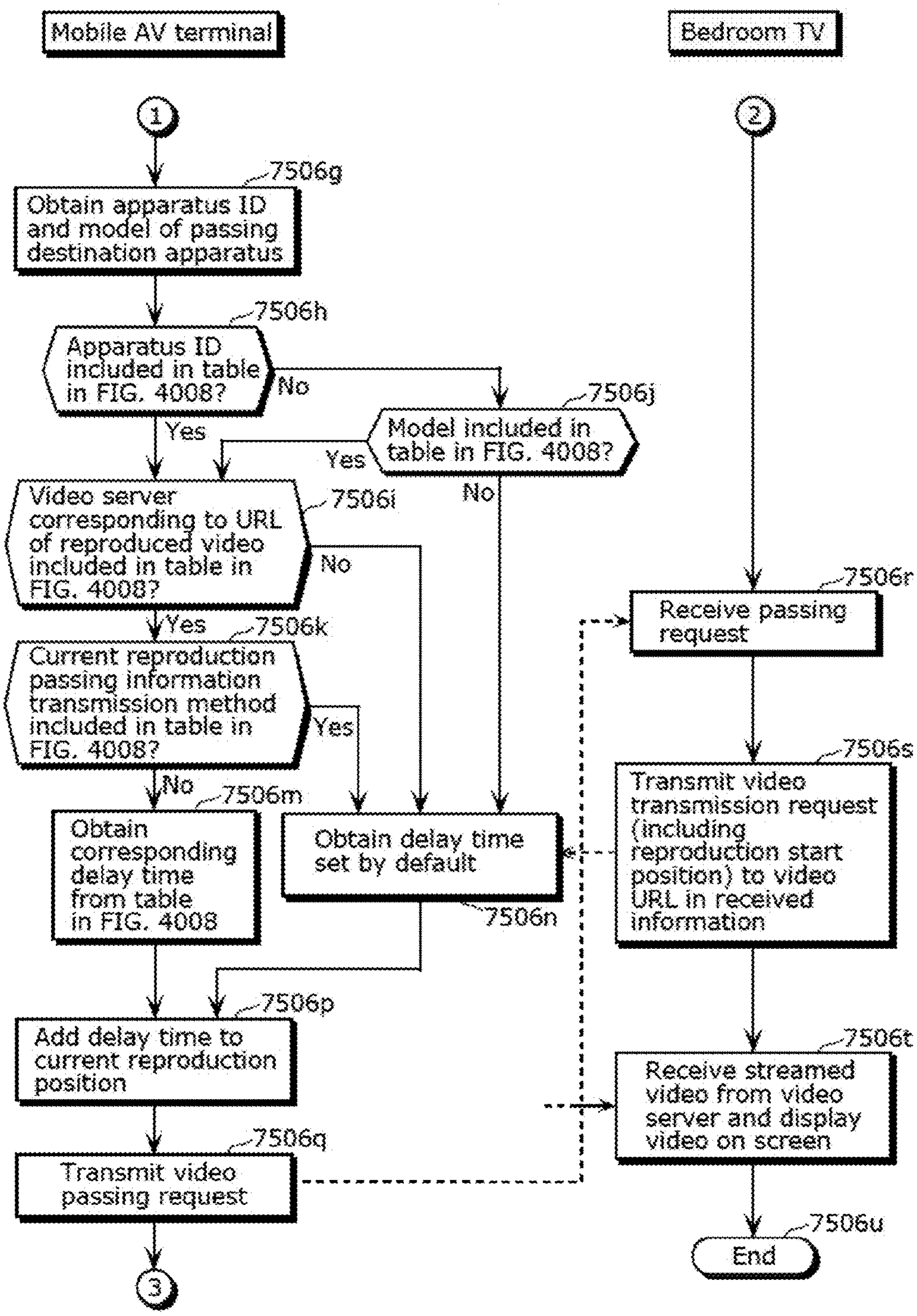
Figure 121:
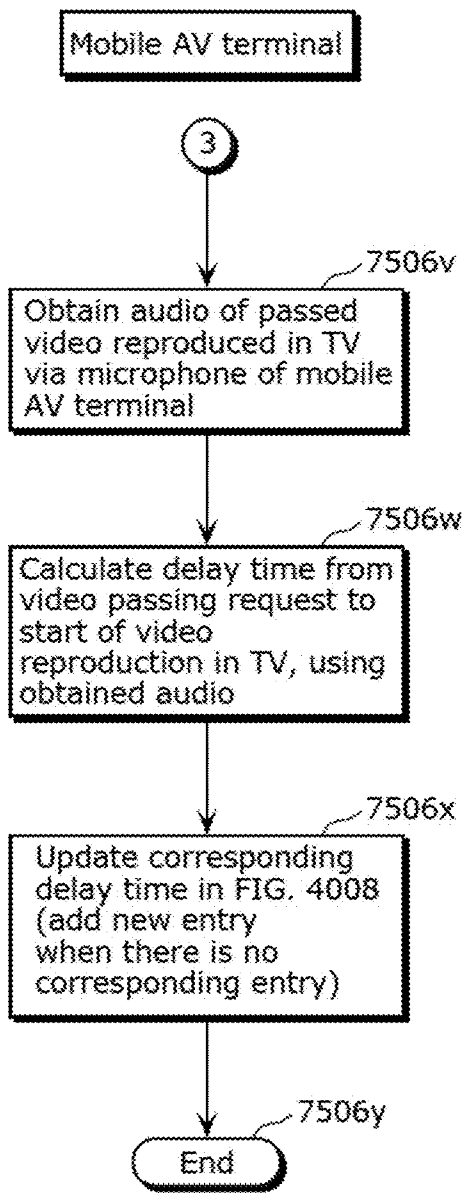

A procedure of passing video being reproduced in the mobile AV terminal to the TV is described below, with reference to FIGS. 119 to 121.

In Step 7506*a*, the mobile AV terminal starts reproducing video. In Step 7506*b*, the mobile AV terminal searches nearby apparatuses for an apparatus to which the video reproduction can be passed.

In Step 7506*c*, the mobile AV terminal determines whether or not the apparatus to which the video can be passed is found nearby. In the case where the determination in Step 7506*c* results in Yes, the mobile AV terminal proceeds to Circle 1. In the case where the determination in Step 7506*c* results in No, the mobile AV terminal ends the procedure in Step 7506*d*. A method of touching a bedroom TV to find the apparatus by proximity wireless communication may also be used as the method for finding the apparatus to which the video can be passed.

In Step 7506*e*, the bedroom TV responds to a broadcast transmitted from the mobile AV terminal. In Step 7506*f*, the bedroom TV receives a video passing request. The bedroom TV then proceeds to Circle 2.

In Step 7506*g* from Circle 1, the mobile AV terminal obtains an apparatus ID and a model of the passing destination apparatus. In Step 7506*h*, the mobile AV terminal determines whether or not the apparatus ID of the passing destination apparatus is included in the table shown in FIG. 112. In the case where the determination in Step 7506*h* results in Yes, the mobile AV terminal proceeds to Step 7506*i* to determine whether or not a video server corresponding to the URL of the video being reproduced is included in the table shown in FIG. 112.

In Step 7506*k*, the mobile AV terminal determines whether or not a current reproduction passing information transmission method is included in the table shown in FIG. 112. In the case where the determination in Step 7506*k* results in Yes, the mobile AV terminal proceeds to Step 7506*m* to obtain a corresponding delay time from the table shown in FIG. 130.

In Step 7506*p*, the mobile AV terminal adds the delay time to the current reproduction position. In Step 7506*q*, the mobile AV terminal transmits a video passing request. The mobile AV terminal then proceeds to Circle 3.

In the case where the determination in Step 7506*h* results in No, the mobile AV terminal proceeds to Step 7506*j* to determine whether or not the model of the passing destination apparatus is included in the table shown in FIG. 112. In the case where the determination in Step 7506*j* results in Yes, the mobile AV terminal proceeds to Step 7506*i*.

In the case where the determination in Step 7506*i* or 7506*j* results in No, the mobile AV terminal proceeds to Step 7506*n*.

In Step 7506*r* from Circle 2, the bedroom TV receives the passing request. In step 7506*s*, the bedroom TV transmits a video transmission request including a reproduction start position, to the video URL in the received information. In Step 7506*t*, the bedroom TV receives streamed video from the video server and displays the received video on the screen. The bedroom TV then ends the procedure in Step 7506*u*.

In Step 7506*v* from Circle 3, the mobile AV terminal obtains, via the microphone of the mobile AV terminal, audio of the passed video reproduced in the TV. In Step 7506*w*, the mobile AV terminal calculates a delay time from when the video passing request is issued to when the video reproduction in the TV starts, using the obtained audio. In Step 7506*x*, the mobile AV terminal updates the corresponding delay time in the table shown in FIG. 112. The mobile AV terminal then ends the procedure in Step 7506*y*. In the case where, when updating the delay time in Step 7506*x*, there is no corresponding entry to be updated in the existing table data, the mobile AV terminal newly creates a table entry and adds the entry to the table.

Furthermore, the following variation of this embodiment is possible.

Though this embodiment describes the structure of data passing between the TV 1 (45) and the mobile AV terminal 8006, the present invention is not limited to such a structure. Data passing may also be performed between two different mobile AV terminals each provided with an RFID tag reader/writer.

In this way, not only video reproduction data but various data can be exchanged between RFID tag reader/writer-equipped apparatuses. As an example of data exchanged between apparatuses, the mobile AV terminal may obtain position information from a stationary apparatus such as a TV, as a result of which the mobile AV terminal can specify or correct the position of the mobile AV terminal. Position information exchange between apparatuses will be described in detail in Embodiment 19.

The following describes data exchange between mobile AV terminals in this embodiment.

Figure 122:
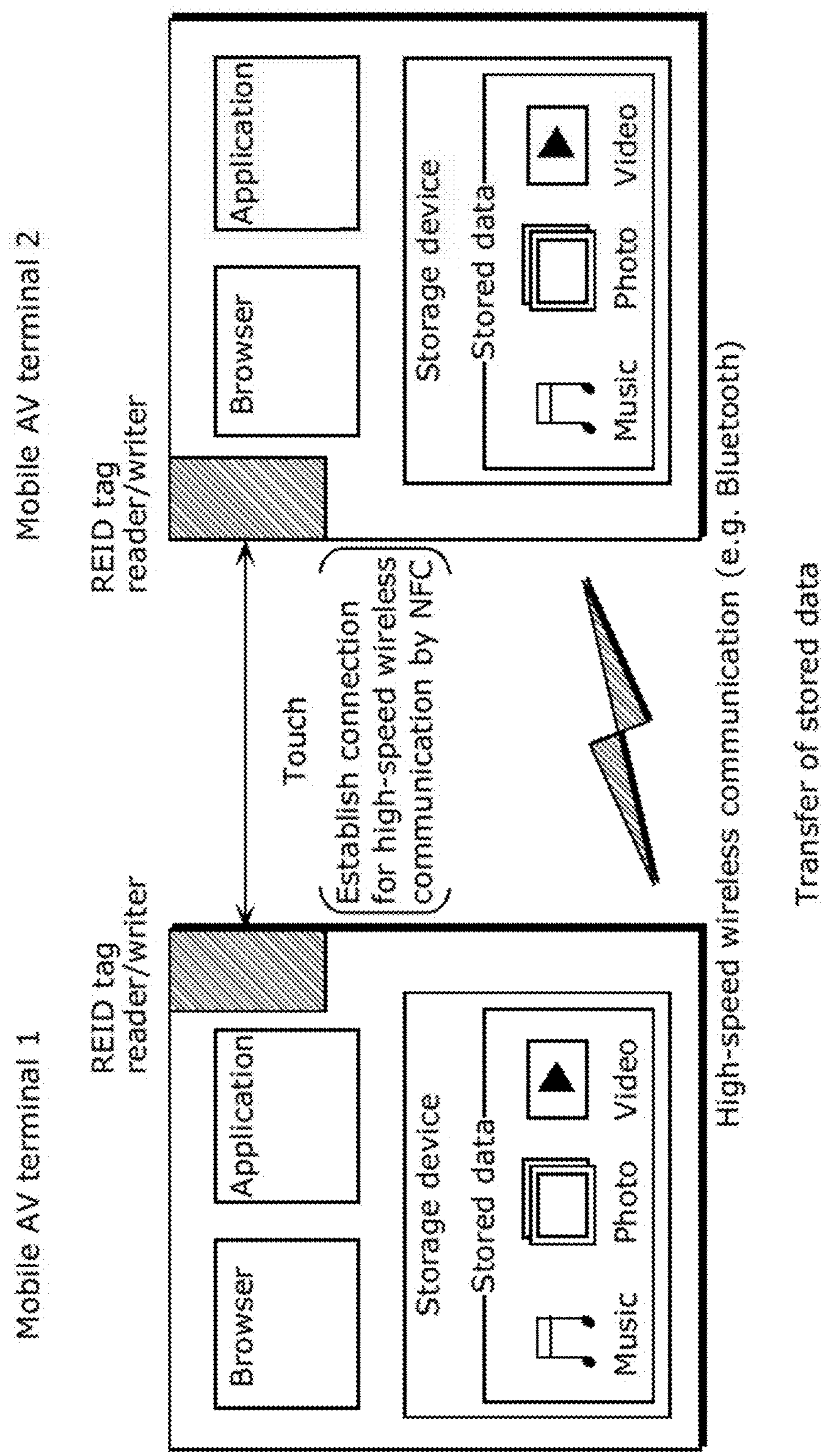

FIG. 122 is a schematic diagram showing data exchange between mobile AV terminals using NFC. Data exchange using NFC and high-speed wireless communication is shown in FIG. 122.

FIGS. 123 to 126 are sequence diagrams showing data exchange between mobile AV terminals using NFC or high-speed wireless communication.

Figure 123:
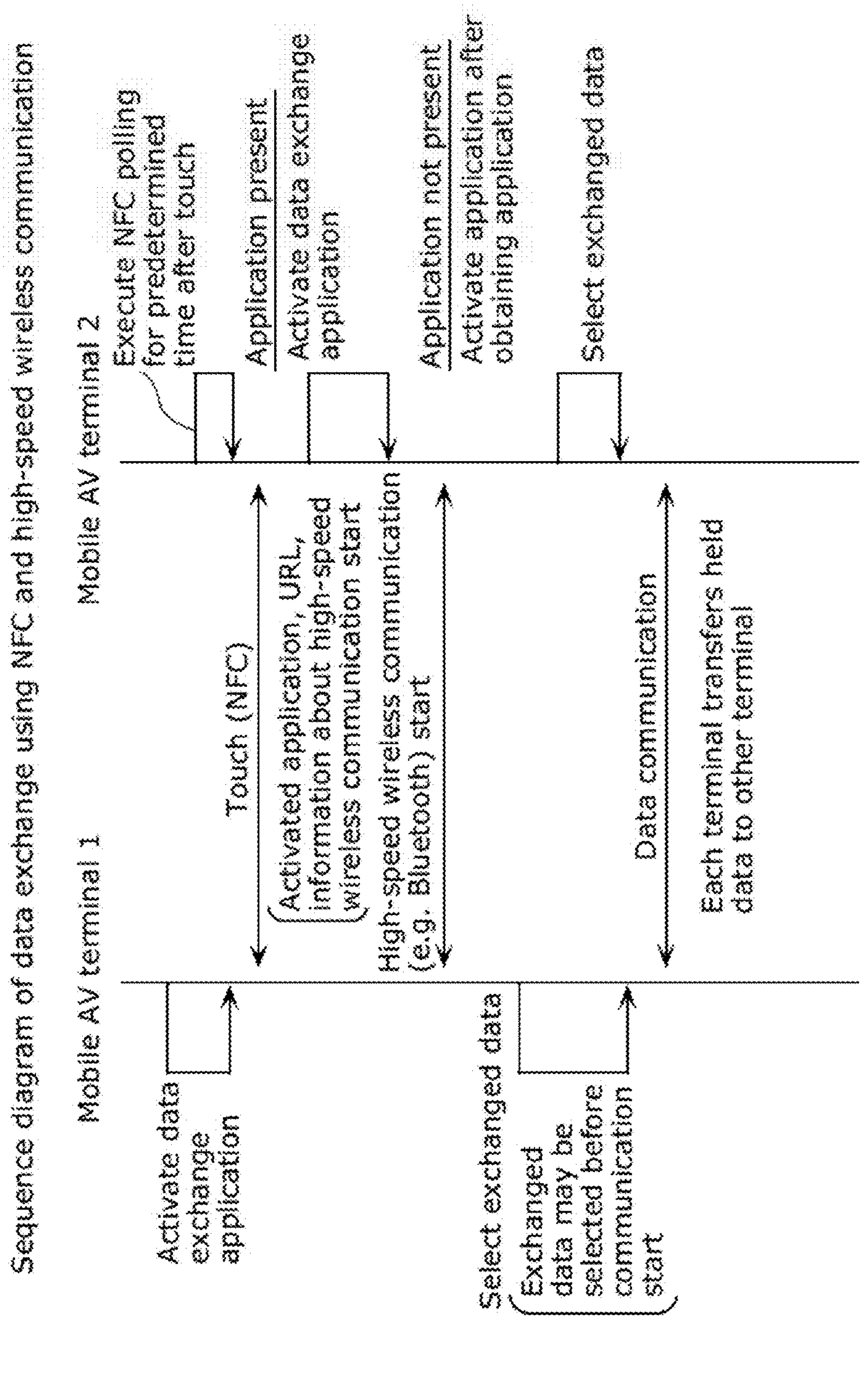

In FIG. 123, after a mobile AV terminal 1 activates a data exchange application, data for establishing connection for high-speed wireless communication is exchanged between mobile AV terminals using NFC. Depending on whether or not the application designated by the mobile AV terminal 1 is present, a mobile AV terminal 2 activates the application, or obtains the application from a predetermined location and then activates the obtained application. After this, the mobile AV terminals exchange stored data using high-speed wireless communication.

In FIG. 123, data transmitted from the mobile AV terminal 1 to the mobile AV terminal 2 may include information for designating the application to be activated in the mobile AV terminal 2, or application category information necessary for displaying a list of applications which are held in the mobile AV terminal 2 and are capable of processing the exchanged data transmitted from the mobile AV terminal 1.

In this case, a screen as shown in FIG. 139 is displayed on the mobile AV terminal 2, allowing the operator of the mobile AV terminal 2 to select an application to be activated.

By transmitting the category information, the exchanged data can be processed using the application desired by the operator of the mobile AV terminal 2.

In detail, for example when a category "URL" is included in the exchanged data, a list of applications capable of processing URL, such as a browser and a text editor, are displayed on the mobile terminal 2.

Here, the category information such as "URL" or "image" may be explicitly transmitted from the mobile AV terminal 1, like the data type shown in FIGS. 138A and 138B. Alternatively, a message to activate a candidate application may be transmitted from the mobile AV terminal 1 so that, for example in the case of determining the category as URL from the received information, the mobile AV terminal 2 displays a list of applications capable of processing URL as shown in FIG. 139.

In FIGS. 124 to 126, the application activation is performed using NFC in the same way as in FIG. 123. However, the method of data exchange after the application activation is different from FIG. 123, and so its description is given below.

In FIG. 124, data held by each mobile AV terminal is exchanged using only NFC. In FIG. 125, the mobile AV terminal 1 obtains data stored in a server or the like, and transmits the obtained data to the mobile AV terminal 2. In FIG. 126, a URL of a server or the like in which data to be passed from the mobile AV terminal 1 to the mobile AV terminal 2 is held is transmitted using NFC, and the mobile AV terminal 2 downloads, from the server, the data to be passed.

FIGS. 127 and 128 are terminal screen flow diagrams when exchanging data using NFC and high-speed wireless communication. FIGS. 129 and 130 are terminal screen flow diagrams when exchanging data using NFC.

A procedure of data exchange between mobile AV terminals is described below, with reference to FIGS. 131 to 136, 138A, and 138B. FIG. 137 is a diagram showing a communication format in data exchange using NFC shown in FIGS. 138A and 138B.

In Step 7501*a*, the mobile AV terminal 1 activates a data exchange application. In Step 7501*b*, the mobile AV terminal starts polling.

In Step 7501*c*, the mobile AV terminal 1 touches the mobile AV terminal 2. In Step 7501*d*, the mobile AV terminal 1 receives a polling response. In Step 7501*e*, the mobile AV terminal 1 transmits a data exchange request. In Step 7501*f*, the mobile AV terminal 1 receives a response to the request. The mobile AV terminal 1 then proceeds to Circle 1.

In Step 7501*g*, the mobile AV terminal 2 touches the mobile AV terminal 1. In Step 7501*h*, the mobile AV terminal 2 transmits the polling response. In Step 7501*i*, the mobile AV terminal 2 receives the data exchange request. In Step 7501*j*, the mobile AV terminal 2 displays the request on a screen. In Step 7501*k*, the user of the mobile AV terminal 2 enters the response to the request. In Step 7501*m*, the mobile AV terminal 2 determines whether or not the request is accepted. In the case where the determination in Step 7501*m* results in Yes, the mobile AV terminal 2 proceeds to Step 7501*n* to transmit a data exchange request acceptance response. The mobile AV terminal 2 then proceeds to Circle 2.

In the case where the determination in Step 7501*m* results in No, the mobile AV terminal 2 proceeds to Step 7501*p* to transmit a data exchange request rejection response. The mobile AV terminal 2 then ends the procedure in Step 7501*q*.

In Step 7502*a* from Circle 1, the mobile AV terminal 1 determines whether or not the acceptance response is received. In the case where the determination in Step 7502*a* results in Yes, the mobile AV terminal 1 proceeds to Step 7502*c* to wait for connection for high-speed wireless communication. In Step 7502*e*, the mobile AV terminal 1 receives a connection request.

In Step 7502*f*, the mobile AV terminal 1 performs verification of whether or not the terminal sending the connection request is the destination of the data exchange request. In Step 7502*g*, the mobile AV terminal 1 determines whether or not the terminal is the mobile AV terminal 2. In the case where the determination in Step 7502*g* results in Yes, the mobile AV terminal 1 proceeds to Step 7502*i* to transmit a connection permission notification. The mobile AV terminal 1 then proceeds to Circle 3.

In the case where the determination in Step 7502*a* results in No, the mobile AV terminal 1 proceeds to Step 7502*b* to display the response rejection on a screen. The mobile AV terminal 1 then ends the procedure in Step 7502*d*. In the case where the determination in Step 7502*g* results in No, the mobile AV terminal 1 proceeds to Step 7502*h* to transmit a connection rejection notification. The mobile AV terminal 1 then returns to Step 7502*c* or proceeds to Step 7502*p*.

In Step 7502*j* from Circle 2, the mobile AV terminal 2 stores the contents of each record in the received message, in a memory. In Step 7502*k*, the mobile AV terminal 2 determines whether or not the mobile AV terminal 1 is present on the same network. In the case where the determination in Step 7502*k* results in Yes, the mobile AV terminal 2 proceeds to Circle 4.

In the case where the determination in Step 7502*k* results in No, the mobile AV terminal 2 proceeds to Step 7502*m* to transmit the connection request for corresponding high-speed wireless communication according to apparatus information shown in FIG. 136. In Step 7502*n*, the mobile AV terminal 2 waits for a connection response. In Step 7502*p*, the mobile AV terminal 2 receives the connection response. The mobile AV terminal 2 then proceeds to Circle 4.

In Step 7503*a* from Circle 3, the mobile AV terminal 1 completes the connection for high-speed wireless communication. The mobile AV terminal 1 then proceeds to Circle 7.

In Step 7503*b* from Circle 4, the mobile AV terminal 2 completes the connection for high-speed wireless communication. In Step 7503*c*, the mobile AV terminal 2 extracts data shown in FIGS. 138A and 138B received via NFC. In Step 7503*d*, the mobile AV terminal 2 determines whether or not a designated application package is already installed. In the case where the determination in Step 7503*d* results in Yes, the mobile AV terminal 2 proceeds to Circle 6.

In the case where the determination in Step 7503*d* results in No, the mobile AV terminal 2 proceeds to Step 7503*e* to determine whether or not any application corresponds to the designated application group. In the case where the determination in Step 7503*e* results in Yes, the mobile AV terminal 2 proceeds to Step 7503*i* to determine whether or not there are a plurality of corresponding applications. In the case where the determination in Step 7503*i* results in Yes, the mobile AV terminal 2 proceeds to Step 7503*j* to display the applications and inquire of the user which application is to be activated.

In Step 7503*k*, the mobile AV terminal 2 receives the user's designation of the application. The mobile AV terminal 2 then proceeds to Circle 6.

In the case where the determination in Step 7503*e* results in No, the mobile AV terminal 2 proceeds to Step 7503*f* to determine whether or not there is any data about an application obtainment method such as a URL. In the case where the determination in Step 7503*f* results in Yes, the mobile AV terminal 2 proceeds to Circle 8. In the case where the determination in Step 7503*f* results in No, the mobile AV terminal 2 proceeds to Step 7503*g* to notify the user that the application cannot be activated. The mobile AV terminal 2 then ends the procedure in Step 7503*h*. In the case where the determination in Step 7503*i* results in No, the mobile AV terminal 2 proceeds to Circle 5.

In Step 7504*a* from Circle 7, the mobile AV terminal 1 selects data to be exchanged. In Step 7504*b*, the mobile AV terminal 1 determines whether or not a transmission command is executed. In the case where the determination in Step 7504*b* results in Yes, the mobile AV terminal 1 proceeds to Step 7504*c* to transmit the data.

In Step 7504*d*, the mobile AV terminal 1 displays a transmission-in-progress message on the screen. In Step 7504*e*, the mobile AV terminal 1 determines whether or not the transmission is completed. In the case where the determination in Step 7504*e* results in Yes, the mobile AV terminal 1 proceeds to Step 7504*f* to determine whether or not to end the application. In the case where the determination in Step 7504*f* results in Yes, the mobile AV terminal 1 ends the procedure in Step 7504*g*.

In the case where the determination in Step 7504*b* results in No, the mobile AV terminal 1 returns to Step 7504*a*.

In the case where the determination in Step 7504*e* results in No, the mobile AV terminal 1 returns to Step 7504*d*.

In the case where the determination in Step 7504*f* results in No, the mobile AV terminal 1 returns to Step 7504*a*.

In Step 7504*h* from Circle 5, the mobile AV terminal 2 activates a browser and opens a designated URL. In Step 7504*i*, the mobile AV terminal 2 downloads and installs the application. In Step 7504*j*, the mobile AV terminal 2 activates the application. In Step 7504*k*, the mobile AV terminal 2 waits for data reception.

In Step 7504*m*, the mobile AV terminal 2 determines whether or not data is received. In the case where the determination in Step 7504*m* results in Yes, the mobile AV terminal 2 proceeds to Step 7504*n* to display a reception-in-progress message on the screen. In Step 7504*p*, the mobile AV terminal 2 determines whether or not the reception is completed. In the case where the determination in Step 7504*p* results in Yes, the mobile AV terminal 2 proceeds to Step 7504*q*.

In Step 7504*q*, the mobile AV terminal 2 determines whether or not to end the application. In the case where the determination in Step 7504*q* results in Yes, the mobile AV terminal 2 ends the procedure in Step 7504*r*.

In the case where the determination in Step 7504*m* results in No, the mobile AV terminal 2 returns to Step 7504*k*.

In the case where the determination in Step 7504*p* results in No, the mobile AV terminal 2 returns to Step 7504*n*.

In the case where the determination in Step 7504*q* results in No, the mobile AV terminal 2 returns to Step 7504*k*.

In Step 7504*j* from Circle 6, the mobile AV terminal 2 activates the application.

[Embodiment 9]

FIG. 140 is a sequence diagram in the case where, when the TV 1 (45) is receiving video from the video server 1 (8004), the TV 1 (45) transmits a video transmission request so that the mobile AV terminal 8006 gets the video. As in FIG. 91, the user powers on the mobile AV terminal 8006 to pass the video. The mobile AV terminal 8006 searches for the access point 8009 of wireless LAN, and establishes wireless connection. The mobile AV terminal 8006 also obtains an IP address by DHCP or the like, and establishes IP connection. The user presses the video passing button, to generate a video passing request in the memory in the RFID unit. Here, the video passing request includes the IP address of the mobile AV terminal 8006. The user further brings the RFID tag 8007 of the mobile AV terminal 8006 into proximity of the RFID tag reader/writer 46 of the TV 1, to transmit the video passing request to the TV 1 (45). The TV 1 returns a video passing response including the IP address of the video server, to the mobile AV terminal 8006. This step is intended to enhance security (to prevent arbitrary access from an irrelevant terminal), and may be omitted. As in FIG. 91, in the case where video is in encrypted form, necessary security-related information (such as a key) is exchanged at the same time. Upon receiving the video passing request, the TV 1 (45) transmits a video transmission request including the IP address of the mobile AV terminal 8006, to the video server 1 (8004). Upon receiving the video transmission request, the video server 1 (8004) switches a video transmission destination to the mobile AV terminal 8006. Subsequent processing is the same as in FIG. 91.

FIG. 141 is a sequence diagram in the case where, in the same situation as in FIG. 92, the IP address of the video server 1 (8004) is included in a video passing request. This may be omitted as in FIG. 102. Upon receiving the video passing request, the TV 2 (8003) returns a video passing response including the IP address of the TV 2. Upon receiving the video passing response, the mobile AV terminal 8006 transmits a video transmission request including the IP address of the TV 2, to the video server 1 (8004). Upon receiving the video transmission request, the video server 1 (8004) changes the video transmission destination to the TV 2 (8003). Subsequent processing is the same as in FIG. 92.

[Embodiment 10]

FIG. 142 is a sequence diagram in the case where a remote controller 8200 having a RFID unit is used instead of the mobile AV terminal 8006. Here, the remote controller is assumed to be a terminal that does not have a display unit but has a transmission and reception unit and a memory of a RFID unit. The user presses a video passing button, to generate a video passing request in the memory in the RFID unit. The user further brings the RFID unit of the remote controller 8200 into proximity of the RFID unit 46 of the TV 1, to transmit the video passing request to the TV 1. Upon receiving the video passing request, the TV 1 generates a video passing response (including the IP address of the video server 1, a video identifier, and a video display time), and returns the video passing response to the remote controller 8200. Moreover, upon receiving the video passing request from the remote controller 8200, the TV 1 (45) transmits a video stop request to the video server 1 (8004). After going upstairs, the user brings the RFID unit of the remote controller 8200 into proximity of the RFID unit of the TV 2, to transmit a video passing request (including the IP address of the video server 1, the video identifier, and the video display time). Upon receiving the video passing request, the TV 2 (8003) returns a video passing response, and transmits a video transmission request (including the video identifier and the video display time) to the video server 1. The video server 1 (8004) starts transmitting the designated video from the designated time.

[Embodiment 11]

FIG. 143 is a sequence diagram in the case where the video server 1 is capable of synchronous transmission. After conducting predetermined communication with the TV 1, the mobile AV terminal transmits a video transmission request to the video server 1. Upon receiving the video transmission request, the video server 1 (8004) temporarily transmits video data to both the TV 1 (45) and the mobile AV terminal (8006). This processing is intended to achieve complete seamlessness. The mobile AV terminal and the TV 1 may both display the video temporarily, or some kind of synchronization processing may be performed to achieve complete seamlessness. The video server 1 (8004) stops video data transfer to the TV 1, on the basis of a video stop request from the mobile AV terminal (8006). Note that the TV 1 (45) may transmit the stop request, or the video server 1 (8004) may automatically stop video data transfer.

[Embodiment 12]

This embodiment relates to a best mode of a method for ensuring traceability in a distribution form from factory shipment to use environment of an apparatus (device) provided with a RFID tag as described in Embodiments 1 to 10.

Recently, given a need to improve distribution efficiency and also an increase in number of accidents caused by aging of home electrical products, there has been debate for ensuring traceability, namely, an ability to trace from manufacture and distribution through to a use environment by a consumer.

As an example, an attempt has been made to enable management from manufacture to distribution to a retailer, by adding a passive RFID tag that uses a communication frequency in a band of 860 to 900 MHz, to a package, a returnable container, or the like. The band of 860 to 900 MHz is also called a UHF (UltraHigh Frequency) band. The RFID tag in the UHF band can exhibit a largest communication distance in the passive type (i.e., the type of tag to which power is supplied from outside), and is capable of communication of 2 to 3 m though depending on output magnitude. Accordingly, by simultaneously passing a plurality of products through a RFID reader gate during transportation, RFID information of the plurality of products can be instantly read with efficiency. Hence, the RFID tag is particularly expected to be used in the field of distribution.

However, such a RFID tag of the UHF band has the following problem. Though the RFID tag certainly has an advantage of long-distance communication, the apparatus cannot be traced once it has been delivered to the consumer because the RFID tag is added to the package or the returnable container. Besides, the long-distance feature is not particularly effective in an entity interface, an object interface, or an intuitive interface described in Embodiments 1 to 10 where apparatuses are brought into proximity of each other to trigger an action.

Meanwhile, the RFID tag (47) described in Embodiments 1 to 10 is assumed to be a HF-RFID tag in a band of 13.56 MHz (though this is not a limit for the present invention). HF-RFID has a feature of short-distance communication (within about several ten cm though depending on output). For instance, the HF-RFID tag is widely used in applications that intuitively trigger an action by bringing two terminals close to each other, such as electronic money and ticket gate systems. This being so, for example when the user wants to display photographs captured by a digital camera on a TV, the user brings the digital camera 1 close to the RFID reader/writer 46 of the TV, thereby realizing an entity interface where an entity (camera) and an entity (TV) operate in conjunction with each other or an intuitive interface where digital camera photographs are displayed on the TV.

In this embodiment, the HF-RFID tag is added to the apparatus (device) as in Embodiments 1 to 10, and also the UHF-RFID tag is added to the package or the returnable container of the apparatus, to ensure product traceability even after the product is reached the use environment of the consumer.

FIG. 144 is a schematic diagram illustrating processing of HF-RFID and UHF-RFID upon apparatus factory shipment.

Though this embodiment describes the case where the apparatus is a recorder, the apparatus is not limited to such and may be any of a digital home appliance, a food, and the like.

An apparatus M003 assembled in a manufacturing line is provided with a HF-RFID tag M001. The HF-RFID tag M001 has a memory, which has a structure of a dual interface that is accessible from both the apparatus M003 and a communication unit of the RFID tag M001. A product serial number of the apparatus and a program (command) for copying the product serial number of the apparatus to the UHF-RFID tag are stored in the memory of the HF-RFID tag M001, in an assembly stage.

After the assembly of the apparatus M003 is completed, prior to packaging, a handy reader/writer M002 reads the product serial number from the memory of HF-RFID, and also records a device ID of UHF-RFID (UHF-RFID unique information) indicating that the UHF-RFID tag is added to the package or the like.

Next, having packaged the apparatus M003, a UHF-RFID tag M005 is added to a package M004. The UHF-RFID tag M005 may be directly added to the package, or may be added to a management table or the like. After adding the UHF-RFID tag M005, the handy reader/writer M002 records the product serial number and the like read from the HF-RFID tag M001 of the apparatus M003, to the UHF-RFID tag M005. In this embodiment, the handy reader/writer M002 is capable of accessing both HF-RFID and UHF-RFID.

Thus, the product serial number of the apparatus M003 is recorded on the HF-RFID tag M001, and the same information is also recorded on the UHF-RFID tag M005 of the package M004. Therefore, in distribution after packaging, there is no need to read the product serial number and the like from the HF-RFID tag that is capable of only short-distance access. By simultaneously passing a plurality of products through the gate, the information can be directly read from the UHF-RFID tag. This contributes to more efficient distribution.

Moreover, after the apparatus M003 reaches the use environment of the consumer, the HF-RFID tag can be read by a remote controller of a TV and the like. Hence, not only the distribution but also the apparatus reaching the consumer can be traced. As a result, overall traceability that contributes to improved distribution efficiency and prevents accidents caused by aged deterioration during apparatus use can be achieved.

FIG. 145 is a schematic diagram illustrating a recording format of a memory accessible from the UHF-RFID tag M005.

The memory of the UHF-RFID tag M005 stores a UHF device ID M010, HF existence identification information M011, an apparatus product serial number and actual article number M012, a date M013, a manufacturer M014, a model number, lot number, and product name M015, and a status M016.

The UHF device ID M010 is stored in a non-rewritable area of the memory, and is identification information for uniquely identifying the UHF-RFID tag. The UHF device ID M010 is read by the handy reader/writer before the apparatus M003 is packaged, and recorded in the HF-RFID tag M001. Hence, even when the correspondence relation between the package and the apparatus is wrong, the correspondence relation can be checked beforehand and appropriate processing can be performed.

The HF existence identification information M011 is identification information for determining whether or not the HF-RFID tag M001 is added to the apparatus M003. In the case where the HF-RFID tag M001 is added to the apparatus M003, when recording the product serial number and the like read from the HF-RFID tag M001 to the UHF-RFID tag M005 upon apparatus packaging, the HF-RFID existence identification information is changed to information indicating "exist". This makes it possible to determine whether or not to check the correspondence relation between UHF-RFID and HF-RFID, by referencing only the HF existence identification information M011.

The apparatus product serial number and actual article number M012 is at least one of the product serial number read from the HF-RFID tag M001 and an actual article number associated with the product serial number. The actual article number is a number of the apparatus used in the distribution process. It is possible to uniquely associate the actual article number with the product serial number, by equally managing the product serial number and the actual article number. Accordingly, in this embodiment, the product serial number and the actual article number are not clearly distinguished from each other but are described as the same information.

The date M013 corresponds to a manufacturing year/month/date, and information of a date and time of manufacture of the apparatus M003 is recorded as the date M013. This information may be recorded by the handy reader/writer M002 at the time of recording the product serial number to the UHF-RFID tag M005, or manufacturing year/month/date information stored in the HF-RFID tag M001 may be read and recorded to the UHF-RFID tag M005.

The manufacturer M014 is identification information of a manufacturer of the apparatus M003. This information may be recorded by the handy reader/writer M002 at the time of recording the product serial number to the UHF-RFID tag M005, or manufacturer information stored in the HF-RFID tag M001 may be read and recorded to the UHF-RFID tag M005.

The model number, lot number, and product name M015 may be recorded by the handy reader/writer M002, or the corresponding information may be read from the HF-RFID tag M001 and recorded, in the same way as the date M013 and the manufacturer M014. Regarding the lot number, in the case where lot management from manufacture to distribution can be conducted in a unified fashion, the information may be written by any of the two methods. However, in the case where unified management is not conducted and manufacturing line information is unclear upon packaging, reading the lot number from the HF-RFID tag M001 and recording it to the UHF-RFID tag M005 is more advantageous because stricter management can be achieved.

The status M016 is status information in the distribution form. That is, status information necessary for tracing the apparatus, such as factory storage, factory shipment, distribution center reception, distribution center shipment, and retailer reception, is recorded as the status M016. The status M016 is rewritable in each distribution process.

Moreover, the UHF-RFID tag M005 stores management server specific information M017. The management server specific information M017 is the same information as the server specific information 48 in the second memory 52 of the HF-RFID tag M001. When packaging the apparatus M003, the server specific information is read from the HF-RFID tag M001 and copied to the UHF-RFID tag M005. This enables unified management to be performed by the same management server for both of the management in the distribution stage using UHF-RFID and the management after the apparatus is delivered to the consumer.

Therefore, after the apparatus M003 is delivered to the consumer, by reading the management server address information from the HF-RFID tag M001, accessing the management server, and making an inquiry by the apparatus product serial number M012, trace information from manufacture to distribution managed by the management server can be visualized to the consumer. This enhances consumer assurance and safety.

FIG. 146 is a flowchart illustrating a flow of processing of copying the product serial number and the like to the UHF-RFID tag M005 from the HF-RFID tag M001 upon factory shipment of the apparatus M003.

First, the HF-RFID tag M001 is added to the assembled product (the apparatus M003) (M020). This flowchart shows an example where the HF-RFID tag is added after the assembly of the apparatus M003. However, in the case of a structure of a dual interface where the apparatus and the HF-RFID tag can both access a shared memory, the HF-RFID tag M001 is added to the apparatus M003 during assembly of the apparatus M003.

Next, the product serial number of the apparatus M003 is recorded on the HF-RFID tag M001 (M021). This is a step of recording the product serial number on the HF-RFID tag M001 in the assembly process through the handy reader/writer M002. The product serial number is obtained from a management server of the manufacturing line using the handy reader/writer or the like, and recorded on the HF-RFID tag M001 by proximity wireless communication.

After the product serial number is recorded on the HF-RFID tag M001, the apparatus M003 is packaged (M022). The packaging mentioned here denotes packaging for distribution with a cushioning material and the like, or containment into a returnable container and the like.

After completing the packaging, the UHF-RFID tag M005 is added to the package (including a returnable container surface, a management label, and so on) (M023).

Following this, the handy reader/writer M002 communicates with a management server M025, thereby reading the actual article number associated with the product serial number read from the HF-RFID tag M001 (M024). The actual article number is a management number used in product distribution, and is issued by the management server. The actual article number is in a one-to-one correspondence with the product serial number.

After the actual article number is read from the management server M025, the product serial number or the actual article number, and the existence identification information indicating that the HF-RFID tag M001 is added to the apparatus M003, are recorded on the UHF-RFID tag M005 (M026).

As a result of the above processing, the product serial number recorded on the HF-RFID tag M001 which is added to the apparatus M003 is copied to the UHF-RFID tag M005 after apparatus packaging. Typically, the communicable distance of the HF-RFID tag is short, and so it is difficult to access the HF-RFID tag after packaging. In this embodiment, however, the product serial number or the actual article number is recorded on the UHF-RFID tag that has a longer communicable distance than the HF-RFID tag and is added to the package. This allows for apparatus distribution management after packaging.

Moreover, even if the package or the like is discarded after the apparatus is delivered to the consumer, the product serial number and the like can be read by accessing the HF-RFID tag added to the apparatus. Thus, unified management from distribution to consumer use can be achieved, which contributes to traceability over a wide range.

FIG. 147 is a flowchart illustrating a flow of processing in the distribution process of the apparatus M003.

First, upon factory shipment of the apparatus M003, the product serial number or the actual article number is read from the UHF-RFID tag M005 by using a handy reader/writer or passing the product through a UHF-RFID reader gate. Shipment completion is registered in the management server M025 that can communicate with the handy reader/writer or the UHF-RFID reader gate, and also the UHF-RFID tag M005 is accessed from the handy reader/writer or the UHF-RFID reader gate to rewrite the status (M016) in the memory of the UHF-RFID tag M005 to indicate shipment completion (M030).

After factory shipment, the product is retained in the distribution center or the like. Upon subsequent shipment from the distribution center, the product serial number or the actual article number is read from the UHF-RFID tag M005 by a handy reader/writer or a UHF-RFID reader gate, and distribution center shipment completion is registered in the management server M025 and also the status (M016) in the UHF-RFID tag M005 is rewritten to indicate distribution center shipment completion (M032).

Likewise, upon retailer shipment, retailer shipment completion is registered in the management server M025, and the status M016 in the UHF-RFID tag M005 is rewritten to indicate retailer shipment completion (M034).

Lastly, when the apparatus M003 reaches the consumer, the product serial number is read from the HF-RFID tag M001 by the reading unit of the RF-ID reader/writer 46 of the TV remote controller or the like, and registered in the management server M025 in association with TV identification information (M036). Accordingly, in this embodiment too, the server specific information 48 is recorded in the second memory 52 of HF-RFID beforehand. The server specific information 48 in this embodiment indicates the management server M025, and includes a URL for connecting to the management server M025. Hence, by reading the HF-RFID tag M001 of the apparatus M003 using the TV remote controller or the like having the RF reader/writer, management information from manufacture to distribution can be obtained from the management server M025. In addition, by managing the product serial number in association with the TV identification information in the management server M025, it is possible to store a list of apparatuses possessed by the user in the management server in association with the user's TV, without managing personal information of the user.

When the user's apparatus has a problem, a message warning the user is adequately displayed on the TV, with it being possible to prevent a serious accident.

As described above, according to this embodiment, in the manufacturing stage the apparatus and the package are respectively provided with the HF-RFID tag and the UHF-RFID tag, which each carry existence identification information of the other tag. Moreover, the product serial number and the management server specific information stored in the HF-RFID tag are copied to the UHF-RFID tag. As a result, it is possible to provide a system in which management can be performed even after the apparatus reaches the consumer while maintaining distribution management convenience, unlike a conventional system where traceability is attained only during distribution.

Though this embodiment describes management from manufacture to delivery to the user, the present invention has the same advantageous effects even when the user discards or recycles the apparatus. A procedure in this case can be realized in the same way as in this embodiment.

For example, in FIG. 144, upon factory shipment, the product serial number and the like recorded on the HF-RFID tag M001 added to the apparatus M003 are copied to the UHF-RFID tag M005 added to the package M004 after packaging. The same applies to shipment to a disposal facility or shipment to a recycling center, other than factory shipment. In the case of shipment to a disposal facility, after disposal completion, disposal completion is registered in the management server. This enables unified management to be performed while the product is manufactured, used by the consumer, and put into disposal. Recently, there is a problem of illegal disposal due to disposal cost. However, referencing HF-RFID or UHF-RFID of an illegally disposed apparatus makes it instantly clear in which part of the distribution stage the illegal disposal has been conducted. Thus, the problem of illegal disposal can be alleviated according to this embodiment.

In the case of shipment to a recycling center, since use status information, a problem detection status, a total use time, and the like detected by the use status detection unit 7020 are recorded in an area accessible from the HF-RFID tag, such information can be used for determination of whether or not the apparatus is recyclable, price determination, and so on. When the apparatus is determined as recyclable, information such as TV identification information or personal information managed in the management server M025 in association with the product serial number may be updated and put to use.

[Embodiment 13]

FIG. 148 is a diagram of an overall system structure. A semi-transmissive mirror transmission plate is attached to a mirror unit in a bathroom. A display, a power antenna, and a RF antenna unit are arranged on a back surface of the mirror transmission plate. The user has a mobile terminal with a RF antenna, and displays some kind of video information on the mobile terminal. A procedure of moving this video to the display of the mirror is described below. FIG. 149 is a flowchart of the procedure. First, an image output button of the mobile terminal is pressed (9001*a*). Whether or not information or data obtained via a network or a TV channel is being displayed on the terminal is determined (9001*b*). When such information or data is being displayed, a URL or an IP address of a server transmitting the video or data, a stream ID of the video being displayed, stream reproduction time information, and TV channel information are obtained (9001*c*). After this, power transmission/reception is started from the antenna of the mobile terminal (9001*d*). When the antenna of the mobile terminal is brought into proximity of the antenna on the apparatus (device) side (9001*e*), power or a signal is transmitted from the terminal antenna to the apparatus antenna (9001*f*). The mobile terminal then reads attribute information on the apparatus side (video display capability, audio capability, maximum (average) communication speed of Internet inside and outside the house, whether TV channel connection is available, Internet and communication line type), via the apparatus antenna (9001*h*).

In the case where a video source is a TV and the apparatus is connected to a TV antenna (9001*i*), TV channel information and a TV image reproduction display time are transmitted to the apparatus via the antenna (9002*a*). The apparatus displays video of the TV channel on the screen (9002*b*). The image is not horizontally flipped in the case of TV (9002*c*).

Upon receiving a power supply enable flag from the terminal (9002*d*), the apparatus supplies power to the terminal (9002*e*).

Referring back to the previous step, in the case where the apparatus is connected to the Internet (9001*j*), a video rate and resolution are set according to the attribute information of the apparatus, and a server address optimal for the settings, a server ID on a DLNA network, a stream ID in a server, and stream reproduction display time information are transmitted to the apparatus via the RF antenna (9001*k*).

Referring to a flowchart of FIG. 150, the apparatus displays the stream so as to be synchronous with the display time of the video stream being displayed on the terminal, on the basis of the server IP address, the stream ID, and the stream reproduction display time. Once the synchronization has been established, the apparatus switches from the previous display to the next display, that is, the video on the terminal is seamlessly passed to the apparatus (9002*h*).

In the case where simultaneous display of the video on the terminal and the apparatus is prohibited for copyright protection (9002*i*), when the video display on the apparatus starts seamlessly, the video display on the terminal is stopped by means such as transmitting a video stop instruction from the apparatus to the terminal (9002*j*).

Moreover, when the apparatus receives, from the terminal, a "mirror flip identifier" for horizontally flipping the video on the mirror display (9002*k*), the apparatus horizontally flips the video in the next step. Meanwhile, horizontal flip of characters is not performed (9002*m*).

According to the above method, first, the terminal supplies power to the apparatus, and activates the apparatus when the apparatus is not in operation. This benefits power saving. After this, once the apparatus has started operation, then the apparatus supplies power to the terminal. In the case where the terminal receives video data from a server or the like and distributes the video to the apparatus via a network, the terminal needs to transmit the video for a long time via an access point by wireless LAN. When transmitting a large amount of data by wireless LAN, power consumption is high, and there is a possibility that the battery level of the terminal becomes 0. However, this embodiment provides an advantageous effect of preventing battery drain by supplying power from the apparatus to the terminal. Moreover, the mirror shows a reversed image of a human figure. For example, as in the case of a video instruction for toothbrushing, leaning effectiveness decreases because right and left are reversed. However, this embodiment facilitates leaning by horizontal flipping the image.

[Embodiment 14]

The following describes Embodiment 14 of the present invention. FIG. 151 illustrates environments of home networks assumed in this embodiment. A home network is established in each of houses M1001, M1002, and M1003. Each of the home networks is connected to a registration server M1005 via the Internet M1004. If services provided via a home network are limited within a corresponding house, the registration server M1005 may exist in the house. It is also possible that a home network is divided into various places such as a vacation house and an office, and that a plurality of home networks are used in a single house such as a dormitory or a room-sharing house. It is assumed that, in a house, there are home appliances which are always connected to the Internet (hereinafter, referred to as "always-connected home appliances") and home appliances which are not always connected to the Internet (hereinafter, referred to as "non-always-connected home appliances"). The always-connected home appliances, such as TVs M1008 and M1009, a DVD recorder M1010, and the like, are connected to the Internet via a router M1006 or a wireless Access Point (wireless AP) M1007. The non-always-connected home appliances, such as a digital camera M1011, a microwave M1012, and a refrigerator M1013, are indirectly connected to the Internet as needed. In this embodiment, a mobile terminal (mobile device) such as a mobile phone M1014 is also a terminal included in the home network. The devices in this embodiment can perform simple data communication with other device each other by using a proximity wireless communication device. Each of the devices obtains information of other device using the proximity wireless communication device, and registers the obtained information into the registration server M1005 using a home network device.

FIG. 152 is a hardware diagram of a communication device M1101 according to this embodiment. The communication device M1101 is assumed to have two devices for communication. One of them is a proximity wireless communication device M1102. In general, examples of the proximity wireless communication device M1102 are a Near Field Communication (NFC) function or a Radio Frequency (RF) tag. The other device is a home network communication device M1103. Examples of the home network communication device M1103 are: a wireless communication device using a wireless Local Area Network (wireless LAN) or ZigBee, which is used in connecting home appliances to each other; a wired communication device using Ethernet™ or Power Line Communication (PLC); and a communication device using WiMAX or Third Generation Partnership Project (3GPP), which is used in mobile phones. The communication device also includes a user interface (IF) device M1104. The user IF device is, for example, an input device such as buttons, a display, and an output device using a Light Emitting Diode (LED) or the like. For devices such as TVs and air conditioners, data input/output is generally performed by using a remote controller that is physically separated from the device. For convenience of the description, such a remote controller is also considered as the user IF device in this embodiment.

FIG. 153 is a functional block diagram for explaining a function of a CPU M1105 in the communication device M1101. A device UID obtainment unit M1202 in the communication device M1101 obtains information including device UID for identifying a registration device M1201 (that is a device to be registered). Here, the registration device M1201 transmits a registration command and registration information including device UID of the registration device M1201 to the communication device M1101, by using the proximity wireless communication device M1102. A registration information generation unit M1204 obtains the registration information including the device UID from the device UID obtainment unit M1202, and obtains home ID from a home ID management unit M1205. Then, the registration information generation unit M1204 adds the home ID to the registration information obtained from the registration device M1201 via the device UID obtainment unit M1202, to generate information-added registration information. If position information of the registration device M1201 or the like is to be added to the registration information, the registration information generation unit M1204 obtains the position information from a position information obtainment unit M1206. Examples of the position information are address information based on a post code inputted to a TV, geographical position information generated by a Global Positioning System (GPS) of a mobile phone, and the like. If position information of the registration device M1201 is registered, the registered position information can be used to easily provide services to improve home appliance traceability or the like. The registration information generation unit M1204 transmits the registration information added with the home ID to the registration information transmitting/receiving unit M1207. The home ID management unit manages home ID that is different from communication device ID used by the communication device included in the above-described home network. In conventional home networks, a master device of each communication device manages information for the communication device. The management method is different depending on a type of the corresponding communication device. Therefore, it is not possible to manage information on home-by-home basis. Although there is a situation where ID is inputted by a user for each service, this results in quite low usability. In this embodiment, introduction of new different ID that is home ID makes it possible to manage pieces of information of devices included in a home network without using a communication device or services. When the home ID management unit registers information of a device to the server at the first time, the home ID management unit generates home ID. The home ID may be generated based on position information or UID of the communication device. It is also possible to generate home ID based on a random number to check whether or not the generated home ID does not overlap with any other ID in the registration server. It is further possible that a user sets the home ID. When a registration information transmitting/receiving unit M1207 in the communication device M1101 receives registration information from the registration information generation unit M1204, the registration information transmitting/receiving unit M1207 transmits the received registration information to the registration server M1005 using the home network communication device M1103. The registration server M1005 compares the received registration information to pieces of information stored in the registration database M1208 to determine whether or not the received registration information can be registered. Then, the registration server M1005 sends a registration response back to the communication device M1101. In receiving the registration response, the registration information transmitting/receiving unit M1207 notifies the user of a result of the determination by using the user IF device M1104. If the registration server M1005 determines that the received registration information cannot be registered, the registration information transmitting/receiving unit 1207 notifies the determination to the registration information generation unit M1204 in order to request change of the registration information. Thereby, it is possible to collectively manage devices in a home network including white goods that do not have user IF devices for communication.

FIG. 154 is a flowchart of registering information of the communication device. The communication device M1101 receives the registration command and the device UID from the registration device M1201 by using the device UID obtainment unit M1202 (M1301). After receiving the registration command and the device UID, the communication device M1101 determines whether or not the communication device M1101 has home ID (M1302). If the communication device M1101 does not have the home ID (NO at M1302), then the communication device M1101 obtains home ID (the processing is referred to as "home ID obtainment") (M1303). On the other hand, if the communication device M1101 has the home ID (YES at M1302), the communication device M1101 generates information of the communication device to be registered into the communication device M1101 itself (hereinafter, referred to as "registration information" or "home ID") (M1304). Next, the communication device M1101 transmits the registration information to the registration server M1005 by using the registration information transmitting/receiving unit M1207 (M1305). The communication device M1101 determines whether or not the communication device M1101 receives a response (registration response) to the transmitted registration information from the registration server M1005 (M1306). If the response is not received, then the communication device M1101 presents a user with a registration failure notification for notifying a failure of the registration processing (M1307) and terminates the registration processing. On the other hand, if the communication device M1101 receives the response, then the communication device M1101 presents the user with an inquiry asking whether or not to register the generated information into the communication device M1101 (M1308). If the user replies OK, then the communication device M1101 completes the registration processing. If the user replies NO, the communication device M1101 returns to the home ID obtainment. When it is difficult to obtain home ID, the registration processing is terminated as a failure.

FIG. 155 is a flowchart of the home ID obtainment. The communication device M1101 determines whether or not the communication device M1101 has a function of automatically generating home ID (hereinafter, referred to also as an "automatic generation function") (M1401). If the communication device M1101 has the function, then the communication device M1101 automatically generates the home ID. On the other hand, if the communication device M1101 does not have the function, the communication device M1101 asks the user to manually input the home ID. If there is no method for manually inputting home ID or the user refuses to the manual input, then the communication device M1101 notifies the user of a failure of the registration processing (M1403) to persuade the user to obtain the home ID by any different method. When the communication device M1101 automatically generates home ID, the communication device M1101 selects an appropriate automatic generation function (M1404). If the communication device M1101 can obtain geographical position information by a GPS or the communication device M1101 is a terminal such as a TV for which an address as position information has been generally registered, the communication device M1101 generates the home ID using the position information (M1405). If the communication device M1101 is a terminal generally set in a house, the communication device M1101 generates the home ID using a unique identifier of the communication device M1101 (M1406). Especially if it is difficult to generate effective home ID, the communication device M1101 generates the home ID using a random number (M1407). After generating the home ID, the communication device M1101 transmits the home ID to the server (M1408). Then, the communication device M1101 receives information regarding the generated home ID from the server, and thereby determines whether or not the home ID can be used (M1409). If it is determined that the home ID cannot be used, then the communication device M1101 returns to the processing of generating the home ID. On the other hand, if the home ID can be used, then the communication device M1101 asks the user whether to not to register the generated home ID into the communication device M1101 itself (M1410). If the user replies OK, then the communication device M1101 registers the home ID into the communication device M1101 itself (M1411). Otherwise, the communication device M1101 returns to the processing of generating the home ID.

FIG. 156 is a flowchart of registering information of the registration device. The registration device M1201 transfers a registration command and information including device UID for identifying the registration device M1201, to the communication device M1101 via the proximity wireless communication device. If the communication device M1101 does not have home ID, the communication device M1101 generates provisional home ID and transmits the generated provisional home ID to the registration server M1005 via the home network communication device. The registration server M1005 sends a response with information regarding the provisional home ID to the communication device M1101. On the other hand, if the communication device M1101 has home ID or if the communication device M1101 receives, from the registration server M1005, home ID that is allowed by the registration server M1005 to be used, the communication device M1101 transmits the home ID and the registration information including the device UID to the registration server M1005, thereby completing the registration of information of the registration device M1201.

[Embodiment 15]

In Embodiment 15 of the present invention, a configuration in which the home ID is shared among communication terminals (communication devices) is described. FIG. 157 is a functional block diagram illustrating a function of sharing home ID between communication devices. Communication devices M1101S and M1101R included in a home network share the same home ID using a home network M1601 and the home network communication devices M1103. The communication devices M1101S and M1101R may share the home ID using the proximity wireless communication devices M1102. The communication device according to this embodiment (hereinafter, referred to as a "transmitting communication device M1101S") can share the home ID with another communication device (hereinafter, referred to as a "receiving communication device M1101R") in the same house, by transferring a sharing command and home ID to the receiving communication device via the proximity wireless communication devices M1102. In the transmitting communication device M1101S, a home ID sharing unit M1602S in a home ID management unit M1205S provides the sharing command and the home ID that is held in a home ID storage unit M1209S, to a proximity wireless communication device M1102S. For example, when the proximity wireless communication device M1102S of the transmitting communication device M1101S is moved into proximity of a proximity wireless communication device M1102R of the receiving communication device M1101R, information is transferred between them. Thereby, the home ID in the transmitting communication device M1101S is stored into the proximity wireless communication device M1102R of the receiving communication device M1101R. If a home ID storage unit M1209R in the receiving communication device M1101 does not hold any home ID, a home ID sharing unit M1602R in the receiving communication device M1101R stores the received home ID into the receiving communication device M1101R itself. Thereby, it is possible to quite easily share the home ID between the communication devices. On the other hand, if the home ID storage unit M1209R already holds home ID, the receiving communication device M1101R transmits both the held home ID and the received home ID to the registration server M1005. In receiving both home IDs, the registration server M1005 manages both home IDs virtually as a single home ID. The registration server M1005 may notify both communication devices of one of the home IDs to unify them. Even in this case, the registration server M1005 manages both home IDs virtually as a single home ID since there are non-always-connected devices in the home network. It is possible that ID of a non-always-connected device is updated every time of being connected to the home network and the virtual management by the registration server M1005 ends when updating of all of the registration devices (namely, devices to be registered which are included in the home network) are completed. Thereby, it is possible to unify originally plural home networks into a single network.

The home ID sharing can be performed by using the home network. When a communication device is to be connected to the home network M1601 and a home network connection detection unit M1603S of the communication device detects that the communication device does not hold home ID, the communication device broadcasts a request for home ID sharing to terminals connected to the home network M1601. Terminals holding home ID among the terminals connected to the home network M1601 transmit the home ID to the communication device. Thereby, the home ID sharing is completed prior to start of communication. Here, if a master terminal to respond to requests for home ID sharing is previously selected from among terminals holding the home ID, it is possible to prevent that a device requesting home ID sharing receives responses from a plurality of terminals thereby overburdening the home network. If there is no response, the communication device terminal requesting home ID sharing may obtain home ID by itself.

FIG. 158 is a flowchart of processing performed by the receiving communication device M1101R when home ID is shared using the proximity wireless communication device M1102. When the receiving communication device M1101R receives a sharing command and home ID (M1701), the receiving communication device M1101R determines whether or not the receiving communication device M1101R holds home ID (M1702). If the receiving communication device M1101R does not hold home ID, then the receiving communication device M1101R registers the received home ID, as home ID, into the receiving communication device M1101R itself (M1703). On the other hand, if the receiving communication device M1101R holds home ID, the receiving communication device M1101R compares the held home ID to the received home ID. If the held home ID is identical to the received home ID, the receiving communication device M1101R terminates the processing without any further processes. On the other hand, if the held home ID is not identical to the received home ID, the receiving communication device M1101R selects home ID (M1705). The selection of home ID may be performed by the receiving communication device M1101R or the registration server. In the situation where the receiving communication device M1101R asks the registration server to perform the selection, the receiving communication device M1101R transmits the held home ID and the received home ID to the registration server as sharing information (M1706). Thereby, the receiving communication device M1101R receives, from the registration server, a sharing response including home ID selected by the registration server (M1707). Then, the communication device M1101R inquiries the user whether or not to share (register) the selected ID into the communication device M1101R (M1708). If the user replies OK, the registration processing is completed. t the user replies NO, the received ID receiving communication device M1101R returns to the processing for selecting home ID. In the case where the receiving communication device M1101R itself selects the held home ID, the receiving communication device M1101R transmits the held home ID as home ID and the received home ID as sharing home ID to the registration server (M1709). The registration server notifies updating of the home ID to other communication devices already sharing home ID. In the situation where the receiving communication device M1101R selects the received home ID, then the receiving communication device M1101R updates the held home ID by the received home ID (M1710). In addition, the receiving communication device M1101R transmits the previously held home ID as sharing home ID and the received home ID as home ID to the registration server (M1711). The registration server notifies updating of the home ID to other communication devices already sharing home ID.

FIG. 159 is a flowchart of processing performed by the transmitting communication device M1101S when home ID is shared using the proximity wireless communication device M1102. After transmitting a sharing command and home ID to the registration server, the transmitting communication device M1101S determines whether or not a response to the home ID sharing is received from the registration server (M1752). If there is no response, the transmitting communication device M1101S terminates the processing. On the other hand, if the response including a notification of updating home ID is received, the transmitting communication device M1101S updates the home ID by the notified home ID (M1753) and completes the processing.

FIG. 160 is a sequence diagram of the situation where the registration server selects home ID. The transmitting communication device M1101S transmits home ID_A to the receiving communication device M1101R by using the proximity wireless communication device. The receiving communication device M1101R transmits home ID_B that is held in the receiving communication device M1101R itself and the received home ID_A to the registration server M1005. The registration server selects the home ID_B from the received home IDs, and notifies the home ID_B to a communication device holding the home ID_A and the receiving communication device M1101R to cause the devices to register the home ID_B.

FIG. 161 is a flowchart of processing performed by the transmitting communication device M1101S when home ID is shared using the home network communication device M1103. The transmitting communication device M1101S detects connection to the home network (M1801), and broadcasts a request for home ID sharing to terminals in the home network (M1802). If a response to the request for home ID sharing is received, the transmitting communication device M1101S registers home ID received with the response into the transmitting communication device M1101S itself (M1804). On the other hand, if the response is not received, the transmitting communication device M1101S performs the home ID obtainment (M1303).

FIG. 162 is a flowchart of processing performed by the receiving communication device M1101R when home ID is shared using the home network communication device M1103. After receiving the request for home ID sharing (M1851), the receiving communication device M1101R determines whether or not the receiving communication device M1101R itself is a master terminal selected in the home network (M1852). If the receiving communication device M1101R is the master terminal, then the receiving communication device M1101R transmits home ID held in the receiving communication device M1101R itself in response to the request (M1853). On the other hand, if the receiving communication device M1101R is not the master terminal, then the receiving communication device M1101R does not perform any processes. Here, if a master terminal is not selected from terminals holding home ID, the receiving communication device M1101R responds to all requests for home ID sharing from any terminals without the determination regarding the master terminal.

FIG. 163 is a sequence diagram of the situation where the home ID is shared using the home network communication device M1103. When a communication device detects connection to a home network, the communication device broadcasts a request for home ID sharing to terminals in the home network. Only a communication device M1854 selected as the master terminal from among communication devices receiving the request responds to the request. The communication device receiving the response registers home ID received with the response, into the communication device itself.

[Embodiment 16]

A communication device according to Embodiment 16 of the present invention is described in detail with reference to the drawings. The communication device according to this embodiment of the present invention reads terminal apparatus information regarding a terminal apparatus from the terminal apparatus by using a Near Field Communication (NFC) function, and transfers the terminal apparatus information to a server via a general-purpose network.

FIG. 164 illustrates a system according to this embodiment. The system according to this embodiment includes a terminal apparatus Y01, a communication device Y02, and a server Y04. The subject of this embodiment is the communication device Y02.

The terminal apparatus Y01 is a device having a NFC function (RF-ID unit, IC tag, or NFC tag emulation). The terminal apparatus Y01 is, for example, an electronic terminal apparatus such as a refrigerator, a microwave, a washing machine, a TV, or a recording device. The terminal apparatus Y01 has an internal memory for holding, as terminal apparatus information, a product serial number that is ID for identifying the terminal apparatus Y01, use history information of the terminal apparatus Y01, error information, and the like.

The communication device Y02 has a NFC function for communicating with the NFC function of the terminal apparatus Y01 by proximity wireless communication. The communication device Y02 includes a reader/writer function of reading the terminal apparatus information from the terminal apparatus Y01. The communication device Y02 is, for example, a portable device such as a mobile phone or a remote controller terminal of a TV.

The server Y04 is a server connected to the communication device Y02 in order to communicate with the communication device Y02, via a general-purpose network such as the Internet. The server Y04 includes a database (DB) for accumulating the terminal apparatus information that is read from the terminal apparatus Y01 to the communication device Y02.

The terminal apparatus Y01 includes a Central Processing Unit (CPU) Y011, a failure sensor unit Y012, a use history logging unit Y013, a memory Y014, a modulation unit Y017, and an antenna Y018.

The CPU Y011 is a unit that controls a system of the terminal apparatus Y01. The CPU Y011 controls the failure sensor unit Y012, the use history logging unit Y013, the memory Y014, and the modulation unit Y017 which are units included in the terminal apparatus.

The failure sensor unit Y012 is a unit that detects a location and detail of a failure occurred in each unit included in the terminal apparatus Y01. A piece of failure information detected by the failure sensor unit Y012 is accumulated in a Random Access Memory (RAM) in the memory Y014. The detected failure information is represented by an error code that is uniquely defined depending on a location and condition of the failure.

The use history logging unit Y013 is a unit that performs logging for each piece of use history information every time the terminal apparatus Y01 is operated by the user. The use history information applied with logging is accumulated into the RAM Y016 in the memory Y014. In general, when use history information is used to examine how a failure has occurred, several pieces of use history information up to occurrence of the failure have high priorities of being examined. Therefore, it is desirable that the use history logging unit Y013 according to this embodiment uses the RAM Y016 as First In First Out (FIFO) to chronologically accumulate new pieces of use history information into the RAM Y016. Moreover, when use history information is used to examine how a failure has occurred, it is desirable that several pieces of use history information up to a timing detected by the failure sensor unit Y012 are stored as priorities into the RAM. Therefore, if when five minor failures are detected in using the terminal apparatus Y01, several pieces of operation (use) history information up to the five failures are stored as priorities.

The memory Y014 includes a Read Only Memory (ROM) Y015 and the Random Access Memory (RAM) Y016.

The ROM Y015 previously stores at least a product serial number for uniquely identifying the terminal apparatus Y01 when the terminal apparatus Y01 has been shipped. The user of the terminal apparatus Y01 cannot update the information previously held in the ROM Y05. The product serial number is desirably information by which a manufacturer, a manufacturing lot number, and a manufacturing date of the terminal apparatus Y01 can be determined. It is also desirable that the ROM Y015 is embedded in a semiconductor chip of the CPU Y011. This structure prevents information during memory access to be easily inspected. Therefore, secret key information for authentication and encrypted communication in proximity wireless communication with the communication device can be recorded on the ROM Y015 when shipping.

The RAM Y016 is a rewritable memory in which the failure information detected by the failure sensor unit Y012 and the use history information applied with logging of the use history logging unit Y013 are accumulated.

The modulation unit Y017 is a unit that modulates communication data for proximity wireless communication with the communication device Y02. The modulation method varies depending on employed NFC standard. For example, Amplitude Shift Keying (ASK), Frequency Shift Keying (FSK), Phase Shift Keying (PSK), and the like are used.

An example of the antenna Y018 is a loop antenna. The antenna Y018 generates electromagnetic induction from radio waves emitted from an antenna of the communication device Y02. The antenna Y018 performs at least processing of providing power to the modulation unit Y017 and the memory Y014 to be operated. In addition, the antenna Y018 overlaps reflected waves of the radio waves emitted from the communication device Y02 with signals modulated by the modulation unit Y017 to transmit the terminal apparatus information that is stored in the memory Y014 to the communication device Y02.

As described above, the terminal apparatus according to this embodiment detects failures occurred in each unit included in the terminal apparatus. Then, the terminal apparatus performs logging for use histories to accumulate the use histories into the memory. Then, if the terminal apparatus is moved into proximity of the communication device Y02 to be capable of performing proximity wireless communication with the communication device Y02, the terminal apparatus can transmit the terminal apparatus information stored in the memory into the communication device Y02.

Next, the communication device Y02 according to this embodiment is described. It should be noted that the subject of this embodiment is the communication device Y02.

The communication device Y02 includes an antenna Y021, a CPU Y022, a demodulation unit Y023, a memory Y024, a position information determination unit Y027, a GPS antenna Y031, a communication memory Y032, an information adding unit Y035, and a communication unit Y036.

The antenna Y021 performs polling for calling any terminal apparatuses in order to search for a terminal apparatus communicable with the communication device Y02 by proximity wireless communication. In receiving a response to the polling, the antenna Y021 establishes proximity wireless communication with the responding terminal apparatus Y01 to receive modulated terminal apparatus information from the terminal apparatus Y01, and provides the modulated terminal apparatus information to the demodulation unit Y023. In general, the polling processing is always necessary even if there is no terminal apparatus communicable with the communication device Y02 by proximity wireless communication. This consumes power. Therefore, the communication device Y02 is provided with a switch (not shown) for controlling a timing of start of polling, so that polling processing is performed when the switch is turned ON. This structure can significantly shorten a time period of the polling. As a result, the power consumption amount of the communication device Y02 can be considerably reduced. This is especially efficient when the communication device Y02 operates by a limited power source such as a battery.

The CPU Y022 is a unit that controls a system of the communication device Y02. The CPU Y022 controls operations of each unit included in the communication device Y02.

The demodulation unit Y023 is a unit that demodulates data modulated by the modulation unit Y017 of the terminal apparatus Y01. The demodulated terminal apparatus information is temporarily stored into the memory Y024.

The memory Y024 includes a ROM Y025 and a RAM Y026.

The ROM Y025 is a memory that cannot be rewritten by the outside. The ROM Y025 previously holds a product serial number for uniquely identifying the communication device Y02 when the communication device Y02 has been shipped. The product serial number is desirably information by which a manufacturer, a manufacturing lot number, and a manufacturing date of the communication device Y02 can be determined. It is also desirable that the ROM Y025 is embedded in a semiconductor chip of the CPU Y022. This structure prevents information during memory access from being easily inspected. Therefore, secret key information for authentication and encrypted communication in proximity wireless communication with the terminal apparatus Y01 can be recorded on the ROM Y025 when shipping.

The RAM Y026 holds the terminal apparatus information of the terminal apparatus Y01 which is received by the antenna Y021 and demodulated by the demodulation unit Y023. As described earlier, the terminal apparatus information includes the product serial number for uniquely identifying the terminal apparatus Y01, the use history information of the terminal apparatus Y01, and failure codes.

The position information determination unit Y027 is a group of sensors for determining a location of the communication device Y02. The position information determination unit Y027 includes a latitude/longitude positioning unit (GPS) Y028, an altitude positioning unit Y029, and a position correction unit Y030. The position information determination unit Y027 does not need to always determine a location of the communication device Y02 (location information) if the location information is generated at a timing where the communication device Y02 becomes communicable with the terminal apparatus Y01 using the antenna Y021. As a result, power consumption of the communication device Y02 can be reduced.

The latitude/longitude positioning unit Y028 is a general Global Positioning System (GPS) that receives radio waves from satellites to perform 3-dimensional (3D) positioning of the earth.

The altitude positioning unit Y029 is a general altimeter. The altitude positioning unit Y029 may be any various altimeters, such as an altimeter receiving radio waves to extract an altitude, an altimeter detecting an air pressure to measure an altitude, and the like. The altitude positioning unit Y029 is provide to the communication device Y02 so that an altitude can be detected even in a building where GPS cannot receive radio waves.

The position correction unit Y030 is a unit that corrects a value measured by the GPS to generate more accurate position information. In general, when radio waves from satellites cannot be received in a room or the like, the GPS cannot generate correct position information. Therefore, the position correction unit Y030 includes an electronic compass and a 6-axis acceleration sensor. The electronic compass is used to detect a direction in which the communication device Y02 moves and the acceleration sensor is used to detect a speed of the movement. Thereby, it is possible to correct position information generated by the GPS in a location where the GPS is difficult.

Regarding the information adding unit Y035, when the terminal apparatus information that has been provided from the terminal apparatus Y01 and stored into the memory Y024 is to be transmitted to the server Y04, the information adding unit Y035 adds (a) the product serial number of the communication device Y02 that is stored in the ROM Y025 in the memory Y024 and (b) the position information measured by the position information determination unit Y027, to the terminal apparatus information. This enables the server Y04 to determine which communication device transmits the terminal apparatus information, where the transmitting terminal apparatus is located, for example, and then manage the results of the determination. For example, if a manufacturer of the terminal apparatus finds that the terminal apparatus has a possibility of causing serious accidents, the information in the database of the server Y04 allows the manufacturer to determine where the terminal apparatus is. Thereby, the possibility of causing serious accidents can be reduced. As a result, it is possible to increase sense of safety and security of the user using the terminal apparatus. Furthermore, when the communication device Y02 has a display function as mobile phone terminals have, the above-described terminal apparatus information generated by the information adding unit Y035 makes it possible to determine with which communication device the terminal apparatus having a possibility of accidents can perform proximity wireless communication, and thereby display a notification of the possibility of accidents in the terminal apparatus on the communication device Y02. Thereby, even if such a terminal apparatus generally does not have any display function and is not connected to a general-purpose network, it is possible to transmit a notification of the accident possibility of the terminal apparatus to the communication device Y02 in order to warn the user using the terminal apparatus. As a result, it is also possible to provide a terminal apparatus that can increase sense of safety and security of the user using the terminal apparatus.

The communication unit Y036 is a unit that communicates with the server Y04 via the Internet by using general LAN, wireless LAN, or mobile phone network. Thereby, the communication unit Y036 transmits, to the server Y04, the terminal apparatus information added with the product serial number and the position information of the communication device Y02 as the communication device information. Here, the added terminal apparatus information is further added with a Media Access Control (MAC) address and an Internet Protocol (IP) address to be transmitted to the server Y04.

The server Y04 is connected to the communication device Y02 via a general-purpose network such as the Internet. The server Y04 includes a device management database (DB) for managing the terminal apparatus information.

The device management DB Y041 stores the terminal apparatus information in association with the communication device information. In the device management DB Y041 according to this embodiment, the communication device information is managed as parent device information, and the terminal apparatus information is managed as child device information in association with the parent device information. The child device information is added with the position information generated by the communication device in order to manage further information indicating where the terminal apparatus is.

As described above, in the system according to this embodiment, the terminal apparatus information is read from the terminal apparatus by the communication device using proximity wireless communication. The communication device is touched to the terminal apparatus to communicate with the terminal apparatus to obtain the terminal apparatus information. The communication device adds a product serial number and position information of the communication device to the obtained terminal apparatus information, and transmits the generated information to the server. Thereby, the server can manage the communication device information as parent device information in association with the terminal apparatus information as child device information. Therefore, if a manufacturer of the terminal apparatus finds that the terminal apparatus would cause serious accidents, the manufacture can easily recall the terminal apparatus or display a notification of a possibility of the serious accident on a display unit of the communication device. As a result, it is possible to achieve traceability of the products and to provide the users of the products with safety and security.

FIG. 165 is a sequence diagram of processing performed by the units included in the system described with reference to FIG. 164.

First, the communication device Y02 performs polling to the terminal apparatus Y01 to establish proximity wireless communication. In terms of power consumption amount of the communication device, it is desirable as described earlier that a switch operated by a user is provided so that the polling is performed while the switch is being pressed or the polling starts when the switch is pressed (SY01).

Next, the terminal apparatus Y01 sends a response to the polling to the communication device Y02 in order to establish proximity wireless communication with the communication device Y02 (SY02). At this timing, the position information determination unit Y027 of the communication device Y02 generates position information of a current position to be used as position information of the terminal apparatus Y01. The generation of the position information is not limited to be performed only in completion of the polling. The position information may be generated any time while the proximity wireless communication is established after the response to the polling. It is important to determine the position of the terminal apparatus at a high accuracy, by generating position information of the position where proximity wireless communication, which can be performed when a distance between communicating devices is only several centimeters, is established.

After the establishment of the proximity wireless communication at SY02, mutual authentication between the terminal apparatus Y01 and the communication device Y02 is performed using general public key cryptography, and also key sharing is temporarily performed to share cryptography keys generated by the terminal apparatus Y01 and the communication device Y02 between the devices (SY03). After that, while the proximity wireless communication is established, data on the communication path is encrypted using the cryptography keys to communicate between the devices. As a result, tapping of the data can be prevented.

After completing the key sharing, the terminal apparatus Y01 transmits the terminal apparatus information recorded on the memory Y014 of the terminal apparatus Y01, to the communication device Y02 (SY04).

When the communication device Y02 receives the terminal apparatus information from the terminal apparatus Y01, the communication device Y02 stores the received terminal apparatus information into the memory Y024 of the communication device Y02 (SY05).

When the communication device Y02 completes receiving of the terminal apparatus information from the terminal apparatus Y01, the communication device Y02 issues a connection request to the server Y04 (SY06).

The server Y04 responds to the connection request of SY06 to establish communication with the communication device Y02 (SY07).

After establishing communication between the communication device Y02 and the server Y04, the communication device Y02 adds the communication device information of the communication device Y02 to the terminal apparatus information of the terminal apparatus Y01 to be transmitted to the server Y04 (SY08). Here, the communication device information includes, for example, a product serial number of the communication device Y02, position information of the communication device Y02 when proximity wireless communication with the terminal apparatus Y01 is established, an e-mail address of the user registered in the communication device Y02 (if any), a connection account to the server Y04 registered in the communication device Y02 (if any), and the like.

After adding the communication device information to the terminal apparatus information at SY08, then the communication device Y02 transmits the terminal apparatus information added with the communication device information to the server Y04 (SY09).

The server Y04 registers the terminal apparatus information added with the communication device information received from the communication device Y02, into the device management DB Y041. Thereby, the processing is completed.

Thereby, the server Y04 can manage pieces of information regarding devices for each house, by managing information of each terminal apparatus Y01, which establishes proximity wireless communication with the communication device Y02 touching the terminal apparatus Y01, in association with identification information (product serial number or the like) of the communication device Y02. In addition, for the position information registered as information of a position at which the terminal apparatus is equipped, position information indicating a position where proximity wireless communication is established between the communication device Y02 and the terminal apparatus Y01 is used. Since the proximity wireless communication according to this embodiment is performed at common High Frequency (HF) band of 13.56 MHz, the communication is possible when a distance between communicating devices is within several centimeters. Therefore, if the position information detected in establishing proximity wireless communication is set to be position information of the terminal apparatus, a maximum error is several centimeters which results in assuring an enough accuracy to achieve traceability of the products.

FIG. 166 is a schematic diagram illustrating a group of pieces of information of terminal apparatuses managed in association with information of the communication device Y02 in the device management DB Y041 of the server Y04.

When the user intends to perform user registration or the like for a terminal apparatus using the communication device Y02 in purchasing the terminal apparatus, the following processing is performed. The user equips the terminal apparatus and touches the terminal apparatus by the communication device Y02. Thereby, terminal apparatus information of the terminal information is provided to the communication device Y02 using proximity wireless communication. The communication device Y02 adds the communication device information of the communication device Y02 to the terminal apparatus information in order to be transmitted to the server Y04. In receiving the terminal apparatus information added with the communication device information, the server Y04 manages the terminal apparatus information as child device information and the communication device information as parent device information in association with each other in the device management DB. For example, in the device management DB, terminal apparatus information of a terminal apparatus 1 (for example, a microwave Y052), terminal apparatus information of a terminal apparatus 2 (for example, a washing machine Y053), and terminal apparatus information of a terminal apparatus 3 (for example, a TV Y054), all of which are touched by a communication device Y051, are managed in association with a product serial number of the communication device Y051. Each of the terminal apparatus information includes whereabout information (longitude, latitude, altitude, and the like) and use status information (use histories, error codes, use time periods, and the like). Thereby, the server Y04 can manage pieces of information of devices for each house, because the communication device Y051 touches these terminal apparatuses. As a result, traceability of the terminal apparatuses can be achieved.

Furthermore, the communication device generates position information when proximity wireless communication with the terminal apparatus is established and uses the generated position information as position information of the terminal apparatus. Therefore, it is possible to register a position of the terminal apparatus with an error of several centimeters which is a distance capable for proximity wireless communication between devices. Since the GPS in the communication device is used to generate the position information of the terminal apparatus, each terminal apparatus does not have a GPS, thereby reducing a cost.

FIG. 167 is a schematic diagram illustrating display screens of the display unit of the communication device Y02 when the communication device Y02 touches the terminal apparatus Y01.

First, the description is given for the situation where the communication device Y02 touches the terminal apparatus Y01 to register information of the terminal apparatus Y01 into the server Y04.

When the user operates the communication device Y02 to start up a reader/writer application program of the communication device Y02, the communication device Y02 displays, on a display screen, a message persuading the user to make the communication device Y02 touch the terminal apparatus Y01 for proximity wireless communication (Y060).

When the communication device Y02 touches the terminal apparatus Y01, proximity wireless communication is established between the devices. The communication device Y02 reads terminal apparatus information of the terminal apparatus Y01 from the terminal apparatus Y01, generates position information of a current position, and provides the pieces of information to the memory in which the pieces of information are temporarily stored. Then, the communication device Y02 establishes communication with the server Y04 and transmits the terminal apparatus information added with communication device information of the communication device Y02 to the server Y04. The server Y04 determines whether or not the terminal apparatus information has already been registered in the device management DB. If it is determined that the terminal apparatus information has not yet been registered in the device management DB, then the server Y04 causes the communication device Y02 to display, on the display unit of the communication device Y02, a message asking the user whether or not to register information of the terminal apparatus Y01 (Y061).

Next, when the user selects to register the information of the terminal apparatus Y01, the server Y04 causes the communication device Y02 to display a message asking the user whether or not to register position information of the terminal apparatus. When the user selects to register the position information, the server Y04 registers the position information associated with the terminal apparatus information transmitted from the communication device Y02 to the server Y04, into the device management DB of the server Y04 as position information of the terminal apparatus Y01 (Y062).

Next, the description is given for the situation where the position information of the terminal apparatus Y01 is different from the position information registered in the device management DB of the server Y04.

When the user operates the communication device Y02 to start up a reader/writer application program of the communication device Y02, the communication device Y02 displays, on the display screen, a message persuading the user to make the communication device Y02 to touch the terminal apparatus Y01 by the communication device Y02 to perform proximity wireless communication (Y063).

When the communication device Y02 touches the terminal apparatus Y01, proximity wireless communication is established between the devices. The communication device Y02 reads terminal apparatus information of the terminal apparatus Y01 from the terminal apparatus Y01, generates position information, and transmits the terminal apparatus information added with communication device information of the communication device Y02 to the server Y04. The server Y04 compares (a) a product serial number of the terminal apparatus which is included in the received terminal apparatus information to (b) a product serial number registered in the device management DB, in order to examine whether or not information of the touched terminal apparatus is already registered in the server Y04. In addition, the server Y04 extracts the position information from the received communication device information, and examines whether or not the extracted position information is identical to the position information registered in the device management DB. Since the position information has an error, of course, the determination is made to compare the position information to a threshold value that has the order of several centimeters (in other words, the threshold value is a value corresponding to a distance between devices capable for proximity wireless communication). If it is determined that the extracted position information is different from the registered position information, the server Y04 causes the communication device Y02 to display, on the display unit, a message notifying the user of the result of the determination (Y064).

Then, the communication device Y02 displays, on the display unit, a message asking the user whether or not to update the position information of the terminal apparatus Y01 to information of a current position of the terminal apparatus Y01 (Y065).

If the user selects to update the position information, the communication device Y02 registers the position information generated by touching the terminal apparatus Y01 by the communication device Y02, into the device management DB of the server Y04 as new position information of the terminal apparatus Y01.

Therefore, according to this embodiment, even if the position information that has been registered is changed because the terminal apparatus Y01 is moved and equipped at a different location, it is possible to update the position information to new position information that is generated by touching the terminal apparatus Y01 by the communication device Y02. Thereby, an accuracy of traceability of the terminal apparatus Y01 can be improved.

[Embodiment 17]

FIG. 168 is a functional block diagram of the RF-ID unit N10 according to Embodiment 17 of the present invention.

Referring to FIG. 168, the RF-ID unit N10 includes an antenna N11, a power supply unit N12, a memory N13, a reproducing unit N14, and a data transfer unit N15. The antenna N11 is used for proximity wireless communication. The power supply unit N12 is supplied with power via the antenna N11. The memory N13 is a nonvolatile memory in which pieces of individual identification information are stored. The reproducing unit N14 reproduces data registered in the memory N13. The data transfer unit N15 transmits the data registered in the memory N13 into the outside via the antenna N11.

The memory N13 stores UID N13A, a part number N13B, server specific information N13C, and an operation program N13D. The UID N13A is used to identify a product having the RF-ID unit N10. The part number N13B is used to identify a part number of the product having the RF-ID unit N10. The server specific information N13C is used to specify the registration server N40. The operation program N13D is to be executed by the mobile device N20.

FIG. 169 is a functional block diagram of the mobile device N20 according to this embodiment.

Referring to FIG. 169, the mobile device N20 includes a RF-ID reader/writer N21, a RF-ID storage unit N22, a program execution unit N23, a data processing unit N24, a memory unit N25, a display unit N26, a communication I/F unit N27, a transmission unit N28, a receiving unit N29, a communication unit N30, a GPS N31, a 6-axis sensor N32, a position information storage unit N33, and a CPU N34. The RF-ID reader/writer N21 receives data from the RF-ID unit N10. The RF-ID storage unit N22 holds the data provided from the RF-ID reader/writer N21. The program execution unit N23 executes a program included in the data. The data processing unit N24 performs data processing for image data included in the data. The memory unit N25 holds the image data processed by the data processing unit N24. The display unit N26 displays the image temporarily stored in the memory unit N25. The communication I/F unit N27 connects the mobile device N20 to other device via a general-purpose network. The transmission unit N28 transmits data to the outside via the communication I/F unit N27. The receiving unit N29 receives data from the outside via the communication I/F unit N27. The communication unit N30 communicates with other device via a general-purpose network by using the communication I/F unit N27. The GPS N31 measures a position of the mobile device N20 to generate absolute position information of the mobile device N20. The 6-axis sensor N32 measures a position of the mobile device N20 to generate relative position information of the mobile device N20. The position information storage unit N33 holds results of the measurement of the GPS N31 and the 6-axis sensor N32. The CPU N 34 analyzes the position information stored in the position information storage unit N33.

FIG. 170 is a functional block diagram of the registration server N40 according to this embodiment.

Referring to FIG. 170, the registration server N40 includes a communication I/F unit N41, a transmission unit N42, a receiving unit N43, a communication unit N44, a product information management unit N45, an image data storage unit N46, a program storage unit N47, a position information generation unit N48, and a product control unit N49. The communication I/F unit N41 connects the registration server N40 to other device via a general-purpose network. The transmission unit N42 transmits data to the outside via the communication I/F unit N41. The receiving unit N43 receives data from the outside via the communication I/F unit N41. The communication unit N44 communicates with other device via a general-purpose network by using the communication I/F unit N41. The product information management unit N45 manages product information received from the communication I/F unit N41. The image data storage unit N46 holds image data to be transmitted to the mobile device N20. The program storage unit N47 holds a program to be transmitted to the mobile device N20. The position information generation unit N48 generates a map indicating position relationships among the products having the RF-ID unit N10, by combining the pieces of product information stored in the product information management unit N45. The product control unit N49 controls the products having the RF-ID units N10 by using the pieces of product information stored in the product information management unit N45 and information of a current position of the mobile device N20.

This embodiment differs from the other embodiments in that the products in the house are controlled based on a product map generated from (a) the position information of the mobile device N20 and (b) pieces of position information of the products having the RF-ID units N10.

FIG. 171 is a diagram illustrating an example of an arrangement of the networked products according to this embodiment.

Referring to the arrangement diagram of FIG. 171, in the house, there are: a TV N10A, a BD recorder N10B, an air conditioner N10C, and a FF heater N10K in a living room on the first floor; an air conditioner N10D and a fire alarm N10E in an European-style room on the first floor; an air conditioner N10F and a fire alarm N10G in a Japanese-style room on the first floor; a TV N10I and an air conditioner N10J on the second floor; and a solar panel N10H on a roof.

As described earlier, FIG. 172 is the diagram illustrating an example of the system according to this embodiment. FIG. 172 is a configuration of home appliances in the arrangement of FIG. 171.

This system includes: products from the TV N10A to the FF heater N10K; the mobile device N20 illustrated in FIG. 169; the registration server N40 illustrated in FIG. 170; a home network N100; and an external network N101. Each of the products N10A to N10K has (a) the RF-ID unit N10 illustrated in FIG. 168 and (b) a communication I/F unit N18 used to communicate with other products and devices via a general-purpose network. The home network N100 connects the products N10A to N10K to the mobile device N20. The external network N101 connects the home network N100 to the registration server N40.

The following describes an example of a method of registering information regarding a product having the RF-ID unit N10 into the registration server N40 with reference to FIGS. 173 to 178.

FIG. 173 is a sequence diagram for registering information of the TV N10A into the registration server N40.

First, when a user moves the mobile device N20 to bring the RF-ID reader/writer N21 of the mobile device N20 to proximity of an antenna N11 of the TV N10A, the RF-ID reader/writer N21 supplies power to a power supply unit N12 of the TV N10A via the antenna N11 to provide power to each unit in the RF-ID unit N10 ((1) in FIG. 173).

The reproducing unit N14 in the RF-ID unit N10 generates product information. The product information includes the UID N13A, the part number ID N13B, the server specific information N13C, and the operation program N13D stored in the memory N13.

(a) in FIG. 174 is a table illustrating examples of a structure of the product information. The product information illustrated in (a) in FIG. 174 includes: part number ID that is a part number of the TV N10A (including color information); UID that is a product serial number of the TV N10A; server specific information including an address, a login ID, and a password regarding the registration server N40; and an operation program to be executed by the program execution unit N23 in the mobile device N20.

The data transfer unit N15 in the RF-ID unit N10 modulates the product information and transmits the modulated product information to the RF-ID reader/writer N21 of the mobile device N20 via the antenna N11 ((2) in FIG. 173).

The RF-ID reader/writer N21 in the mobile device N20 receives the product information and stores the received product information into the RF-ID storage unit N22.

The program execution unit N23 executes the operation program included in the product information stored in the RF-ID storage unit N22.

Here, the program execution unit N23 executes the operation program to "generate server registration information to be transmitted to the address of the registration server N40 which is designated in the product information".

(b) in FIG. 174 is a table illustrating another example of a structure of the product information. The server registration information illustrated in (b) in FIG. 174 includes: part number ID that is a part number of the TV N10A (including color information); UID that is a product serial number of the TV N10A; server specific information including a login ID and a password regarding the registration server N40; and position information of the mobile device N20.

Next, the position information of the mobile device N20 is explained.

The GPS N31 in the mobile device N20 constantly operates while the mobile device N20 is active. Detected results of the GPS N31 are stored in the position information storage unit N33.

The 6-axis sensor N32 operates when the mobile device N20 is outside an area in which the GPS N31 can perform positioning. The 6-axis sensor N32 stores detected results into the position information storage unit N33.

The program execution unit N23 generates position information to be included in the server registration information, from the results detected by the GPS N31 and the 6-axis sensor N32 which are stored in the position information storage unit N33.

From the generated position information and information stored in the RF-ID storage unit N22, the program execution unit N23 generates the server registration information as illustrated in (b) in FIG. 174.

Next, the communication unit N30 designates an address of the registration server N40 which is recorded on the RF-ID storage unit N22, to be a destination address of the server registration information.

The transmission unit N28 transmits the generated server registration information via the communication I/F unit N27 ((3) in FIG. 173).

The receiving unit N43 of the registration server N40 receives the server registration information via the communication I/F unit N41.

The communication unit N44 confirms the login ID and the password in the server registration information.

If the login ID and the password are correct, the registration server N40 stores, into the product information management unit N45, the part number ID, the UID, and the position information included in the server registration information.

(a) in FIG. 175 is a table illustrating an example of a structure of product information regarding the TV N10A which is registered on the product information management unit N45. The product information includes the part number ID, the UID, and the position information. The position information includes latitude, longitude, and altitude.

Next, when the registration of the product information of the TV N10A is completed, the communication unit N44 in the registration server N40 generates a server registration completion notification. The server registration completion notification includes (a) image data that is previously stored in the image data storage unit N46 and (b) the operation program stored in the program storage unit N47. Then, the communication unit N44 designates an address of the mobile device N20 to be a destination of the server registration completion notification.

The transmission unit N42 transmits the generated server registration completion notification via the communication I/F unit N41 ((4) in FIG. 173).

The receiving unit N29 of the registration server N20 receives the server registration completion notification via the communication I/F unit N27.

The communication unit N30 in the mobile device N20 confirms the destination address of the server registration completion notification, and provides the received server registration completion notification to the program execution unit N23.

The program execution unit N23 executes the operation program included in the server registration completion notification. Here, the program execution unit N23 executes the operation program to "display image data on the display unit N26."

In more detail, the program execution unit N23 instructs the data processing unit N24 to perform processing for the image data.

The data processing unit N24 thereby performs data processing for the image data. For example, if downloaded image data is compressed, the data processing unit N24 decompresses the image data. If the image data is encrypted, the data processing unit N24 decrypts the image data. The data processing unit N24 may also arrange the downloaded image data in an image display style based on an image display style sheet.

In completing the data processing, the data processing unit N24 provides the processed image data to the memory unit N25 in which the processed image data is temporarily stored.

The display unit N26 displays the image data stored in the memory unit N25. In this example, the image data accumulated in the memory unit N25 is used to notify a user of that registration of information of a corresponding product is completed without any problem.

(b) in FIG. 175 is a table illustrating an example of pieces of product information managed in the product information management unit N45 of the registration server N40, after pieces of information regarding the other products from the BD recorder N10B to the FF heater N10K are registered in the registration server N40 in the same manner as described for the TV N10A. Pieces of product information for which registration processing is performed in the house of FIG. 171 are managed in the same table. In this example, products registered using the same mobile device N20 are determined as products for which registration processing is performed in the same house.

FIG. 176 is a flowchart of an example of processing performed by the RF-ID unit N10 to perform product registration.

First, the RF-ID unit N10 of a target product waits for power supply from the mobile device N20 (N001).

If the RF-ID unit N10 receives power from the mobile device N20, then the processing proceeds to N002. Otherwise, the processing returns to N001.

At N002, the RF-ID unit N10 generates product information including information stored in the memory N13. Then, at N003, the RF-ID unit N10 transmits the product information from the antenna N11 to the mobile device N20. Thereby, the processing is completed.

FIG. 177 is a flowchart of an example of processing performed by the mobile device N20 to perform product registration.

First, at N001, the RF-ID reader/writer N21 of the mobile device N20 supplies power to the RF-ID unit N10 of the target product.

Next, the mobile device N20 waits for product information from the RF-ID unit N10 of the target product (N005).

If the mobile device N20 receives product information from the RF-ID unit N10, then the processing proceeds to N006. Otherwise, the processing returns to N004 to supply power to the RF-ID unit N10 again.

At N006, the mobile device N20 analyzes the received product information and thereby executes an operation program included in the product information.

At N007, the mobile device N20 determines a position of the mobile device N20 itself.

At N008, the mobile device N20 generates server registration information including information of the determined position. At N009, the mobile device N20 transmits the generated server registration information to the registration server N40 via the communication I/F unit N27.

Next, the mobile device N20 waits for a server registration completion notification from the registration server N40 (N010).

If the mobile device N20 receives the server registration completion notification from the registration server N40, then the processing proceeds to N011.

At N011, the mobile device N20 analyzes the server registration completion notification. Then, at N012, the mobile device N20 displays, on the display unit N26, image data included in the server registration completion notification. Thereby, the processing is completed.

FIG. 178 is a flowchart of an example of processing performed by the registration server N40 to perform product registration.

First, the registration server N40 waits for server registration information from the mobile device N20 (N013).

If the registration server N40 receives the server registration information from the mobile device N20, then the processing proceeds to N014. Otherwise, the processing returns to N013.

At N014, the registration server N40 analyzes the received server registration information to determine whether or not a login name and a password included in the server registration information are correct. If the login name and the password are correct, then, at N015, the registration server N40 stores the product information into the product information management unit N45.

At N016, the registration server N40 generates a server registration completion notification that includes an operation program and image data. At N017, the registration server N40 transmits the generated server registration completion notification from the communication I/F unit N41 to the mobile device N20. Thereby, the processing is completed.

Next, the following describes an example of a method of controlling a product having the RF-ID unit N10 by using the position information of the mobile device N20, with reference to FIGS. 179 and 180.

FIG. 179 is a sequence diagram illustrating an example of controlling power for the air conditioner N10J and the TV N10A, when the mobile device N20 is moved from the first floor to the second floor.

The CPU N34 in the mobile device N20 monitors the position information stored in the position information storage unit N33 to determine whether or not predetermined conditions are satisfied. If the predetermined conditions are satisfied, then the CPU N34 generates positional information including position information that is information of a current position of the mobile device N20 (hereinafter, referred to as "current position information").

FIG. 180A is a table illustrating an example of a structure of the positional information.

The positional information includes (a) second server login ID and a second server login password which are regarding the registration server N40 and (b) the current position information of the mobile device N20. The second server login ID and the second server login password are previously obtained in purchasing the product and stored in a memory (not shown). The current position information is obtained from the position information storage unit N33.

The communication unit N30 designates, as a destination of the positional information, an address of the registration server N40 in which information of the product is registered.

The transmission unit N28 transmits the positional information to the registration server N40 via the communication I/F unit N27 ((1) in FIG. 179).

The receiving unit N43 in the registration server N40 receives the positional information via the communication I/F unit N41.

The communication unit N44 in the registration server N40 confirms the second server login ID and the second server login password in the received positional information.

If the second server login ID and the second server login password are correct, then the communication unit N44 provides the positional information to the product control unit N49.

The product control unit N49 provides the second server login ID to the position information generation unit N48.

According to instructions from the product control unit N49, the position information generation unit N48 obtains pieces of product information as illustrated in (b) in FIG. 175 from the product information management unit N45 based on the second server login ID. Then, the position information generation unit N48 generates a product map from pieces of position information of the respective products. The product map shows positions of the products in the house illustrated in FIG. 171. The position information generation unit N48 provides the generated product map to the product control unit N49.

FIG. 181 illustrates an example of the product map generated by the position information generation unit N48.

The product map is a 3D map (or 3D product map) in which illustrations of the products are arranged at positions based on the respective pieces of position information.

The product control unit N49 controls the products from the TV N10A to the FF heater N10K, by using (a) the current position information of the mobile device N20 included in the positional information and (b) the product map (or home appliance map) generated by the position information generation unit N48. In this example, the product control unit N49 turns ON a product located most close to the current position information received from the mobile device N20. Here, the product control unit N49 generates product control information including an instruction for turning ON the air conditioner N10J.

FIG. 180B is a table illustrating an example of a structure of first product control information.

The first product control information includes: part number ID of the air conditioner N10J; UID of the air conditioner N10J; and a product control command for turning ON the air conditioner N10J.

The communication unit N44 designates an address of the mobile device N20 to be a designation of the first product control information.

The transmission unit N42 transmits the first product control information to the mobile device N20 via the communication I/F unit N41 ((2) in FIG. 179).

After receiving the first product control information, the mobile device N20 transfers the first product control information to the air conditioner N10J based on the part number ID and the UID in the first product control information ((2)' in FIG. 179).

When the air conditioner N10J receives the first product control information from the communication I/F unit N18, the air conditioner N10J turns ON a power source of the air conditioner N10J if the power source is OFF.

Next, the product control unit N49 turns OFF a product located the farthest from the current position information received from the mobile device N20. Here, the product control unit N49 generates product control information including an instruction for turning OFF the TV N10A.

FIG. 180C is a table illustrating an example of a structure of second product control information.

The second product control information includes: part number ID of the TV N10A; UID of the TV N10A; and a product control command for turning OFF the TV N10A.

The communication unit N44 designates an address of the mobile device N20 to be a designation of the second product control information.

The transmission unit N42 transmits the second product control information to the mobile device N20 via the communication I/F unit N41 ((2) in FIG. 179).

After receiving the second product control information, the mobile device N20 transfers the second product control information to the TV N10A based on the part number ID and the UID in the second product control information ((3)' in FIG. 179).

When the TV N10A receives the second product control information from the communication I/F unit N18, the TV N10A turns OFF a power source of the TV N10A if the power source is ON.

As described above, according to this embodiment, near field communication of RF-ID technology and position information are used to manage, in the registration server N40, positions of products each having the RF-ID unit N10. Thereby, it is possible to automatically control the products according to a current position of the mobile device N20.

Regarding the position information, information detected by the 6-axis sensor N32 (motion sensor) that measures relative position information is used as position information. Therefore, it is possible to update the position information by using the detected results of the 6-axis sensor N32 when the mobile device N20 is outside an area in which the GPS N31 can perform positioning. As a result, correct position information can be obtained even outside the area.

It should be noted that the mobile device N20 according to this embodiment has been described to have the GPS N31 and the 6-axis sensor N32, but the mobile device N20 is not limited to the above-described structure. For example, the mobile device N20 may have only the 6-axis sensor N32. In this aspect, the product information management unit N45 in the registration server N40 stores pieces of relative position information of products which are with respect to a reference point (position information) of the TV N10A which is first registered as illustrated in FIG. 145. Here, a product map generated by the position information generation unit N48 has axes of an x-coordinate, a y-coordinate, and a z-coordinate as illustrated in FIG. 182.

It should also be noted that it has been described in this embodiment that (a) part number ID and UID of a target product which are stored in the RF-ID unit N10 of the target product and (b) position information of the mobile device N20 are registered to the registration server N40, but the present invention is not limited to the above. For example, if the registration server N40 receives again server registration information regarding a product for which registration has already been completed, the registration server N40 may perform processing as illustrated in FIG. 184.

The following describes FIG. 184. Referring to FIG. 184, the table includes: (a) accuracy identifiers for identifying an accuracy of position information; (b) part number ID in association with each accuracy identifier; and (c) processing to be performed when position information in re-received server registration information is different from position information registered in the product information management unit N45.

If the registration server N40 determines, based on the part number ID and the UID included in the re-received server registration information, that the position information has already been registered in the product information management unit N45, then the registration server N40 checks the part number ID. If the registration server N40 determines, based on the part number ID and the UID included in the re-received server registration information, that the position information has already been registered in the product information management unit N45, then the registration server N40 checks the part number ID.

If the part number ID indicates an air conditioner, a solar panel, or a fire alarm, then the registration server N40 notifies the mobile device N20 of the position information stored in the product information management unit N45. The mobile device N20 thereby corrects current position information of the mobile device N20 based on the position information received from the registration server N40.

It should also be noted that FIG. 184 shows the two kinds of accuracy identifiers, but the accuracy identifiers are not limited to the two kinds. It is possible to set more than two kinds of accuracy identifiers for respective different processing.

It should also be noted that the product control unit N49 in this embodiment is included in the registration server N40, but the present invention is not limited to the structure. For example, the product control unit N49 may be included in the mobile device N20 so that the product control unit N49 obtains a product map from the registration server N40 to control products. Besides in the mobile device N20, the product control unit N49 may also be included in a home server (not illustrated) that is connected to the home network N100. In this aspect, the mobile device N20 transmits position information to the home server and obtains a product map from the home server.

It should be noted that the mobile device N20 according to this embodiment is connected to the registration server N40 via the home network N100 and the external network N101 by using the communication I/F unit (general-purpose I/F unit) N27, but the present invention is not limited to the above. For example, the mobile device N20 may have a function of serving as a mobile phone so that the mobile device N20 can be connected to the registration server N40 via at least a mobile phone network (for example, Long Term Evolution (LTE)) by using an interface connectable to the mobile phone network, instead of the communication I/F unit N27 (see FIG. 185). Furthermore, the mobile device N20 may have an interface connectable to a circuit network such as WiMAX so as to be connected to the registration server N40 via at least the WiMAX network. Any other networks can be used to connect the mobile device N20 to the registration server N40.

It should also be noted that, in this embodiment, the product map generated by the position information generation unit N48 is used to determine how to control products, but the present invention is not limited to the structure. For example, image data of the product map generated by the position information generation unit N48 is transmitted to the mobile device N20 that displays the image data on the display unit N26.

It should also be noted that, in this embodiment, the position information generation unit N48 generates the product map based on the information illustrated in (b) in FIG. 8, but the present invention is not limited to the above. For example, pieces product information of products located near the position information of the mobile device N20 in the same house are detected from the product information management unit N45, and then used to generate a product map regarding nearby products in the house. In this aspect, the product control unit N49 performs product control by combining the product map of FIG. 181 and the product map of nearby products. For instance, it is assumed in this embodiment that the TV N10A, which is the farthest from the mobile device N20, is turned OFF but there is a solar panel near the mobile device N20 in the house. Under the assumption, the product control unit N49 controls the TV N10A to be turned ON, for example.

It should also be noted that, in this embodiment, the product information management unit N45 in the registration server N40 stores part number ID, UID, and position information of each product, but the present invention is not limited to the above. For example, it is also possible that a power state (ON or OFF) is obtained in real time from each product via the communication I/F unit N18 of the product, and then managed in the product information management unit N45. The product control unit N49 thereby controls power of the TV N10A located the farthest from the mobile device N20 to be kept ON when the predetermined number of products are powered OFF, although it has been described in the above description that the product control unit N49 turns OFF the TV N10A.

It should also be noted that, in this embodiment, the product control unit N49 turns OFF a product located the farthest from the mobile device N20 and turns ON a product closest to the mobile device N20. However, the present invention is not limited to the above.

The product control unit N49 may control power to be turned ON or OFF for a plurality of products based on the position information of the mobile device N20.

It should also be noted that, in this embodiment, the product control unit N49 turns OFF a product located the farthest from the mobile device N20 and turns ON a product closest to the mobile device N20. However, the present invention is not limited to the above. For example, it is also possible that the CPU N34 in the mobile device N20 stores position information as a movement history into a memory (not illustrated), and regularly provides the movement history to the registration server N40. In this aspect, the registration server N40 estimates, from the movement histories of the mobile device N20, which product is located in which room or which floor, and manages results of the estimation. It is further possible that the product control unit N49 controls power to be turned ON or OFF for each product in the same house based on the estimation results. For example, if it is estimated from the movement histories that the TV N10A and the air conditioner N10C are located in the same room, the product control unit N49 turns OFF the air conditioner N10C when the TV N10A is turned OFF.

In addition to the moving histories, it is also possible to obtain a time of switching ON or OFF each product, thereby estimating which product is in the same room or the same floor.

It should also be noted that, in this embodiment, the product information management unit N45 manages the product information illustrated in FIG. 175 or 182, and the position information generation unit N48 generates the product map illustrated in FIG. 181 or 183. However, the present invention is not limited to the above. For example, it is also possible that image data of a room arrangement created by the user is transmitted from the mobile device N20 to the registration server N40, and therefore managed by the product information management unit N45. In this aspect, the position information generation unit N48 generates a product map as illustrated in FIG. 171, by combining (a) product information illustrated in FIG. 175 or 182 and (b) the image data of the room arrangement.

Here, private information such as the image data of room arrangement may be applied with encryption different from encryption employed for the product information, and then transmitted from the mobile device N20 to the registration server N40.

It is also possible that private information such as the image data of room arrangement is transmitted to a server different from the server receiving the product information, and a product map is generated with reference to the different server when the registration server N40 generates the product map.

It should also be noted that this embodiment may be combined with any other embodiments. For example, it is possible that the function of the terminal apparatus Y01 according to Embodiment 16 is provided to the RF-ID unit N10 according to this embodiment and the function of the communication device Y02 according to Embodiment 16 is provided to the mobile device N20 according to this embodiment. Thereby, the series of processes including the polling, the mutual authentication, and the key sharing illustrated in FIG. 165 can be performed prior to the product registration processing of FIG. 173. Any combination of the embodiments is within a scope of the present invention.

It should also be noted that the units in the above-described embodiments may be typically implemented into a Large Scale Integration (LSI) which is an integrated circuit. These may be integrated separately, or a part or all of them may be integrated into a single chip. Here, the integrated circuit is referred to as a LSI, but the integrated circuit can be called an IC, a system LSI, a super LSI or an ultra LSI depending on their degrees of integration. The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

[Embodiment 18]

FIG. 186 is a diagram illustrating an entire system according to Embodiment 18 of the present invention.

Referring to FIG. 186, the system according to this embodiment includes a RF-ID device O50, a mobile device O60, a first server O101, and a second server O103.

The RF-ID device O50 is a device having a NFC function. The RF-ID device O50 is included in electronic products such as refrigerators, microwaves, washing machines, TVs, and recording apparatuses. The RF-ID device O50 stores, as product information of a corresponding product, (a) a product serial number that is ID for identifying the product, (b) use history information of the product, (d) error information, and the like into a memory of the product.

The mobile device O060 has a NFC function communicable with the NFC function of the RF-ID unit O50 by proximity wireless communication. The mobile device O60 also has a reader/writer function of reading product information from the RF-ID device O50. In addition, the mobile device O60 is a portable device such as a mobile phone terminal and a remote controller terminal for TV.

The first server O101 is a server connected to the mobile device O60 via a general-purpose network such as the Internet in order to communicate with the mobile device O60. The first server O101 has an internal database (DB) in which pieces of RF-ID information read from the RF-ID devices O50 to the mobile device O60 are accumulated.

The second server O103 is a server connected to the first server O101 via a general-purpose network such as the Internet in order to communicate with the first server O101. The second server O103 has an internal database (DB) in which pieces of building information regarding the RF-ID devices O50 are accumulated. Each of the building information is coordinates of a building in which the corresponding RF-ID device O50 is located.

The RF-ID device O50 includes product ID O50, a first server URL O52, service ID O53, and an accuracy identifier O54.

The product ID O51 is ID for identifying a product having the RF-ID device O50. For example, the product ID O51 is a part number (including color information) or a product serial number of the product.

The first server URL O52 is address information of the first server O101.

The service ID O53 is ID for identifying a product classification such as a TV, an air conditioner, or a refrigerator.

The accuracy identifier O54 is information indicating reliability of position information provided from a product with the RF-ID device 10 which has the product ID.

As described above, if the RF-ID device O50 according to this embodiment is moved into proximity of the mobile device O60 to be able to perform proximity wireless communication, the RF-ID device O50 can transmit, to the mobile device O60, the product serial number, the first server URL, the service ID, and the accuracy identifier which are stored in the memory.

Next, the mobile device O60 according to this embodiment is described.

The mobile device O60 includes an antenna O61, a RF-ID reader/writer O62, a coordinate accuracy identification information O63, a CPU O64, a program execution unit O65, a data processing unit O66, a memory unit O67, a display unit O68, a communication antenna O68, a transmission unit O70, a receiving unit O71, a communication unit O72, a position information storage unit O73, a RF-ID storage unit O74, a RF-ID unit O75, a URL unit O76, a reproducing unit O77, a relative position calculation unit O78, a coordinate information sending unit O79, a recording unit O80, a building coordinate information output unit O81, a registered-coordinate unit O82, a determination unit O83, a reference coordinate unit O84, a position information output unit O85, a position information unit O86, a direction information unit O87, a magnetic compass O88, a geomagnetic correction unit O89, a satellite antenna O90, a position information calculation unit O91, position information O92, position information correction unit O93, a direction information correction unit O94, an angular velocity sensor O95, an angular velocity sensor O96, an angular velocity sensor O97, an acceleration sensor O98, an acceleration sensor O99, an acceleration sensor O100, an integrator O105, an integrator O106, and an absolute coordinate calculation unit O107.

The antenna O61 supplies power towards any RF-ID devices so as to search for a RF-ID device with which the mobile device O60 can perform proximity wireless communication. In receiving a response, the antenna O61 establishes proximity wireless communication with the responding RF-ID device O50 to receive modulated information from the RF-ID device O50.

The RF-ID reader/writer O62 demodulates the received modulated information.

The coordinate accuracy identification information O63 extracts an accuracy identifier from the received information.

The CPU O64 controls a system of the mobile device O60. The CPU O64 controls operations of each unit included in the mobile device O60.

The program execution unit O65 executes a program based on the service ID included in the received information.

The data processing unit O66 performs data processing for information transmitted from the first server O101.

The memory unit O67 temporarily stores the information processed by the data processing unit O66.

The display unit O68*d* displays the information stored in the memory unit O67.

The communication antenna O68 is connected to a general-purpose network such as the Internet.

The transmission unit O70 modulates information to be transmitted to the general-purpose network such as the Internet.

The transmission unit O71 demodulates information received via the general-purpose network such as the Internet.

The communication unit O72 generates and analyzes information to be exchanged (transmitted and received) in communication with other devices via the general-purpose network such as the Internet.

The position information storage unit O73 stores position information generated by the mobile device O60.

The RF-ID storage unit O74 holds product ID and service ID which are obtained from the RF-ID device O50.

The RF-ID detection unit O75 detects a response from the RF-ID device O10.

The URL O76 extracts the first server URL from the information received from the RF-ID device O50.

The reproducing unit O77 reproduces the position information stored in the position information storage unit O73.

The relative position calculation unit O78 calculates relative position information from (a) the position information which is obtained from the position information storage unit O73 and then reproduced and (b) position information of a current position (current position information) of the mobile device O60.

The coordinate information sending unit O79 provides other units with the position information of the mobile device O60 which is generated at a timing of receiving a trigger from the RF-ID detection unit O75.

The recording unit O80 writes the position information provided from the coordinate information sending unit O79, into the position information storage unit O73.

The building coordinate information output unit O81 extracts building coordinate information from the information received by the communication antenna O68.

The registered-coordinate unit O82 extracts registered coordinate information from the information received by the communication antenna O68.

The determination unit O83 examines (determines) an accuracy of the registered coordinate information extracted by the registered-coordinate unit O82.

If the determination unit O83 determines that the registered coordinate information is reliable, then the reference coordinate unit O84 sets the registered coordinate information to be reference coordinate information and provides the reference coordinate information to the position information correction unit O93.

The position information output unit O85 generates position information using direction information provided from the direction information unit O87 and position information provided from the position information unit O86, and provides the generated position information to another unit.

The position information provided from the position information unit O86 and the direction information provided from the direction information unit O87 are position information of the mobile device O60 which is provided form the absolute coordinate calculation unit O107 that includes the position information correction unit O93 and the direction information correction unit O94.

The magnetic compass O88 determines a direction.

The direction information unit O89 generates direction information from information detected by the magnetic compass O88.

The satellite antenna O90 communicates with satellites.

The position information calculation unit O91 calculates position information of the mobile device O60 from a result of the communication with the satellites. For example, the position information calculation unit O91 calculates longitude, latitude, and altitude of the position of the mobile device O60.

The position information unit O92 generates position information from the position information generated by the position information calculation unit O91.

The position information correction unit O93 corrects a result of position information obtained from the integrators O105 and O106, by using pieces of information provided from the position information O92, the reference coordinate unit O84, and the building coordinate information output unit O81.

The direction information correction unit O94 corrects a result of direction information obtained from the integrators O105 and O106, by using the information provided from the direction information unit O89.

The angular velocity sensor O95 measures an angular velocity in the x-axis direction of the mobile device O60.

The angular velocity sensor O96 measures an angular velocity in the y-axis direction of the mobile device O60.

The angular velocity sensor O97 measures an angular velocity in the z-axis direction of the mobile device O60.

The acceleration sensor O98 measures an acceleration in the x-axis direction of the mobile device O60.

The acceleration sensor O99 measures an acceleration in the y-axis direction of the mobile device O60.

The acceleration sensor O100 measures an acceleration in the z-axis direction of the mobile device O60.

The integrator O105 integrates results of the measurement of the angular velocity sensors O95, O96, and O97.

The integrator O106 integrates results of the measurement of the acceleration sensors O98, O99, and O100.

The absolute coordinate calculation unit O107 includes the position information correction unit O93 and the direction information correction unit O94, in order to calculate absolute coordinates of the mobile device O60.

As described above, the mobile device O60 according to this embodiment can determine a position of the mobile device O60 when the mobile device O60 receives the product information from the RF-ID device O50, thereby generating position information of the mobile device O60. Thereby, the mobile device O60 transmits, to the first server O10, the position information and the product information of the product having the RF-ID device O50 in association with each other. In addition, (a) the reference coordinates and the building coordinate information which are generated from the registered coordinates received from the RF-ID device O50, (b) the position information generated by the position information unit O92, and (c) the information generated by the direction information unit O89 allow the current position information of the mobile device O60 to be corrected. In addition, combination of the registered coordinate information in the first server O101 and the building coordinate information in the second server O103 makes it possible to generate a 3D product map of a building in which a product having the RF-ID device 10 registered by using the mobile device O60 is located. It is also possible to display the generated 3D product map on the display unit O68.

Next, the first server O101 according to this embodiment is described.

The first server O101 is a server connected to the mobile device O60 via a general-purpose network such as the Internet. The first server O101 includes a registered-coordinate information unit O102 in which pieces of information regarding products having the RF-ID devices O50 are managed.

The registered-coordinate information unit O102 receives the information of the RF-ID device O10 and the information of the mobile device O60 which are in association with each other. The registered-coordinate information unit O102 manages the information of the mobile device O60 as parent device information and the RF-ID device O50 as child device information in association with each other. The child device information is added with the position information generated by the mobile device O60 so as to manage also information indicating whether the terminal device (product having the RF-ID device O50) exists. In addition, combination of the building coordinate information received from the second server O103 and the information in the registered-coordinate information unit O102 makes it possible to generate a 3D product map of products including the mobile device O60 arranged in the corresponding building.

Next, the second server O103 according to this embodiment is described.

The second server O101 is a server connected to the first server O103 via the general-purpose network such as the Internet. The second server O103 includes a building coordinate database O104 in which a room arrangement and coordinates of each existing building (for example, longitude, latitude, and altitude) are managed in association with each other.

The room arrangement and coordinates of each existing building stored in the building coordinate database O104 can be combined with the registered coordinate information registered in the first server O103 in order to generate a 3D product map of products including the mobile device O60 arranged in the corresponding building. The building coordinate database O104 may be managed as private information in a server having security higher than that of the first server O101 (for example, a server having setting of preventing the server from directly communicating with the mobile device O60). In this aspect, it is possible reduce leakage of the private information.

As described above, in the system according to this embodiment, the product information of the product having the RF-ID device O50 is read by the mobile device O60 using proximity wireless communication. Then, the mobile device O60 transmits, to the first server O103, (a) the product information received from the RF-ID device O50 and (b) the position information generated by touching the RF-ID device O50 by the mobile device O60 to perform proximity wireless communication, which are in association with each other. The first server O103 can manage the information of the mobile device O60 as parent device information and the information of the product having the RF-ID device O50 as child device information, in association with each other. In addition, if relative positions of such products having the RF-ID devices O50 are calculated using pieces of the position information of the products, the relative positions can be used to generate a 3D map of the products.

In addition, the system includes the second server O103 having a database in which a room arrangement and coordinates of each building are managed. The room arrangement and coordinates are combined with pieces of position information of products which are managed in the first server O101. Thereby, it is possible to generate a 3D map (3D product map) of the products having the RF-ID devices O50 arranged in each building.

Moreover, the mobile device O60 can correct the current position information of the mobile device O60 by using (a) the reference coordinates and the building coordinate information which are generated from the registered coordinates received from the RF-ID device O50, (b) the position information generated by the position information unit O92, and (c) the information generated by the direction information unit O89.

The following describes processing of registering the product information of the product having the RF-ID device O50 into the first server O101.

If the mobile device O60 touches the RF-ID device O50 to be able to perform proximity wireless communication with the RF-ID device O50, the mobile device O60 supplies power and clock to the RF-ID device O50 that thereby starts operating.

With the power supply, the RF-ID device O50 modulates the product ID O51, the first server URL O52, the service ID O53, and the accuracy identifier O54 which are stored, and transmits these pieces of data to the mobile device O60.

In receiving the product ID O51, the first server URL O52, the service ID O53, and the accuracy identifier O54 by the antenna O61, the mobile device O60 demodulates the received pieces of information in the RF-ID device O62.

The URL unit O76 extracts the first server URL O52 and provides the extracted first server URL O52 to the communication unit O72.

The RF-ID storage unit O74 stores the product ID O51 and the service ID O53.

The coordinate accuracy identification information O63 extracts the accuracy identifier O54 and provides the extracted accuracy identifier O54 to the determination unit O83.

The RF-ID detection unit O75 provides the coordinate information sending unit O79 and the reference coordinate unit O84 with a trigger for notifying of the receipt of the pieces of information from the RF-ID device O50.

In receiving the trigger, the coordinate information sending unit O79 provides the communication unit O72 with the position information of the mobile device N60 which is received from the position information output unit O85.

Here, the description is given for the position information of the mobile device O60 outputted by the position information output unit O85.

First, the absolute coordinate calculation unit O107 receives (a) a result of integrating, by the integrator O105, results detected by the angular velocity sensors O95 to O97 and (b) a result of integrating, by the integrator O106, results detected by the acceleration sensors O98 to O100.

Here, in the absolute coordinate calculation unit O107, the direction information correction unit O94 and the position information correction unit O93 correct the results of the integrators O105 and O106, based on (a) the information of the position information unit O92 storing the calculation result of the position information calculation unit O91 using the satellite antenna O90 and (b) information of the direction information unit O89 storing the results of the orientation indicated by the magnetic compass O88.

Next, the absolute coordinate calculation unit O107 provides the corrected direction information in the direction information unit O87 and the corrected position information in the position information unit O86 to the position information output unit O85.

The position information output unit O85 generates position information from the corrected direction information in the direction information unit O87 and the corrected position information in the position information unit O86.

By the above-described processing, the mobile device O60 eventually generates position information (current position information) of the mobile device O60.

Then, the program execution unit O65 provides the product ID and the service ID, which are stored in the RF-ID storage unit O74, to the communication unit O72.

The communication unit O72 generates data (information) including (a) the position information provided from the coordinate information sending unit O79 and (b) the product ID and the service ID provided from the program execution unit O65. The communication unit O72 designates the first server URL notified from the URL unit O76 to be a destination address of the data, and provides the data and the address to the transmission unit O70. The transmission unit O70 modulates the data and transmits the modulated data to the first server O101 via the communication antenna O68.

In receiving the data from the mobile device O60, the first server O101 demodulates the modulated data.

The registered-coordinate information unit O102 stores the information of the mobile device O60 as parent device information and the information of the RF-ID device O50 as child device information in association with each other. In more detail, the product ID O51 and the service ID O53 which are information of the product having the RF-ID device O50 (child device) are managed in association with the position information of a position at which the mobile device O60 (parent device) receives the product ID O51 and the service ID O53 from the RF-ID device O50.

The following describes processing performed by the mobile device O60 to generate a 3D map of products (a 3D product map). Each of the products has the RF-ID device O50 and has been registered by the mobile device O60 onto the first server O101.

FIG. 187 is a diagram illustrating an example of an arrangement of the products having the RF-ID units O50 according to this embodiment.

In a living room on the first floor, a TV O50A, a BD recorder O50B, and an air conditioner O50C are arranged. In a Japanese room on the first floor, an air conditioner O50D is arranged. On the second floor, a TV O50E and an air conditioner O50F are arranged. Each of the above products is embedded with the RF-ID device O50. It is assumed that coordinates of a position of each product have already been registered to the registered-coordinate information unit O102 connected to the first server O101, by using the mobile device O60 employing the above-described processing for registering product information stored in the RF-ID device O50.

First, the communication unit O72 in the mobile device O60 generates product information request data to be used to request the first server O101 to provide the product information registered by using the mobile device O60.

The transmission unit O70 modulates the product information request data and transmits the modulated data to the first server O101 via the communication antenna O68.

In receiving the product information request data, the first server O101 generates product information response data and transmits the generated data to the mobile device O60. The product information response data includes the child product information that managed in association with the mobile device O60 as its parent device.

In this example, the product information response data includes the product ID O51, the service ID, and the position information regarding each of the TV O50A, the BD recorder O50B, the air conditioner O50C, the air conditioner O50D, the TV O50E, and the air conditioner O50F.

Next, the first server O101 transmits the same product information response data to the second server O103.

Based on the position information of each product included in the product information response data, the second server O103 extracts, from the building coordinate database O104, image data including position (coordinate) information of a building (hereinafter, "building coordinate information") located at the same position as that of each product.

FIG. 188 illustrates the building coordinate information extracted from the building coordinate database O104. The building coordinate information includes an image of a room arrangement and position information of a building.

The second server O103 transmits the extracted building coordinate information to the mobile device O60.

The receiving unit O71 in the mobile device O60 receives the product information response data via the communication antenna O68, then modulates the received information, and provides the modulated information to the communication unit O72.

The communication unit O72 provides the modulated information to the program execution unit O65.

The program execution unit O65 generates image data of a 3D map of products as illustrated in FIG. 152, using the position information of each of the products which is information included in the product information response data. In the 3D map, the products are mapped as different icons on respective coordinates based on the corresponding position information, so that the user can learn the arrangement of the products at a glance.

The program execution unit O65 provides the generated image data to the data processing unit O66.

The data processing unit O66 provides the image data to the memory unit O67 in which the image data is temporarily stored.

The display unit O68 displays image data of the 3D map of products illustrated in FIG. 188 which is stored in the memory unit O67.

Next, in receiving the building coordinate information from the second server O103 via the communication antenna O68, the receiving unit O71 in the mobile device O60 demodulates the received building coordinate information, and provides the demodulated information to the building coordinate information output unit O81.

The building coordinate information output unit O81 analyzes the building coordinate information and provides the building coordinate information to the display unit O68.

The display unit O68 displays image data of a 3D product map as illustrated in FIG. 190. The displayed image data is a combination of the image data of FIG. 188 and the already-displayed image data of FIG. 189.

As described above, it is possible to generate a 3D product map which the user having the mobile device O60 can see an arrangement of products at a glance.

Next, the description is given for the processing performed by the mobile device O60 to correct the position information of the mobile device O60 by using the building coordinate information.

It is assumed in this example that product information of the air conditioner O50D in FIG. 187 is to be registered to the first server O101. Here, the processing until when the first server O101 receives data including product ID and service ID from the mobile device O60 is the same as the processing described previously, and therefore is not explained again below.

In receiving the product information of the air conditioner O50D, the first server O101 transmits the position information of the air conditioner D50D to the second server O103.

The second server O103 extracts, from the building coordinate database O104, the building coordinate information of FIG. 188 corresponding to the position information of the air conditioner O50D. Then, the second server O103 transmits the extracted building coordinate information to the first server O101.

If the product to be registered is a product usually fixed to a wall or somewhere, such as an air conditioner, the first server O101 compares (a) the position information of the air conditioner that is indicated in the building coordinate information to (b) the position information of the air conditioner that is generated by the mobile device O60. If the position information of the air conditioner that is generated by the mobile device O60 is not close to a wall, the first server O101 transmits, to the mobile device O60, the position information (hereinafter, referred to also as "building coordinate information) of the air conditioner that is indicated in the building coordinate information.

In receiving the building coordinate information, the receiving unit O71 in the mobile device O60 demodulates the building coordinate information and provides the demodulated information to the building coordinate information output unit O81. The building coordinate information output unit O81 determines, based on the building coordinate information and the position information of the air conditioner, that the current position information of the mobile device O60 is to be corrected. Then, the building coordinate information output unit O81 provides the building coordinate information to the position information correction unit O93.

The position information correction unit O93 corrects the current position information of the mobile device O60 based on the building coordinate information provided from the building coordinate information output unit O81.

Next, the mobile device O60 registers information of the air conditioner O50D into the first server O101 in association with the corrected current position information of the mobile device O60.

As described above, (a) the position information of the air conditioner that is indicated in the building coordinate information is compared to (b) the position information of the air conditioner that is generated by the mobile device O60. Thereby, it is possible to determine whether or not (b) the position information of the air conditioner that is generated by the mobile device O60 is deviated from a correct position. As a result, the position information of the mobile device O60 can be corrected.

It should be noted that it has been described that the first server O101 receives the building coordinate information from the second server O103 for the determination. However, the present invention is not limited to the above. For example, it is also possible that the mobile device O60 obtains the building coordinate information from the second server O103 before transmitting information to be registered to the first server O101 and that the mobile device O60 compares the building coordinate information to the position information of the air conditioner O50D to determine whether or not the position information of the mobile device O60 is to be corrected.

Next, the description is given for the processing performed by the mobile device O60 to correct the position information of the mobile device O60 by using the accuracy identifier.

It is assumed that the product information of the air conditioner O50C in FIG. 187 has already been registered to the first server O101 and the mobile device O60 touches the air conditioner O50C.

When the mobile device O60 receives, via the antenna O61, the product ID O51, the first server URL O52, the service ID O53, and the accuracy identifier O54 from the RF-ID device O50 of the air conditioner O50C, the RF-ID unit O62 in the mobile device O60 demodulates these pieces of information.

At this stage, the mobile device O60 does not know whether the product information of the air conditioner O50C has already been registered in the first server O101. Therefore, the mobile device O60 transmits, to the first server O101, data including the position information of the mobile device O60, the product ID, and the service ID by the product registration processing as described previously.

In receiving the data from the mobile device O60, the first server O101 demodulates the received data.

If the registered-coordinate information unit O102 determines that the product information of the air conditioner O50C has already been registered, then the first server O101 generates data including the position information of the air conditioner O50C that is registered in the registered-coordinate information unit O102, and then transmits the generated data to the mobile device O60.

When the receiving unit O71 in the mobile device O60 receives the position information of the air conditioner O50C via the communication antenna O68, the receiving unit O71 demodulates the received position information and provides the demodulated information to the registered-coordinate unit O82.

The registered-coordinate unit O82 extracts the position information from the data including the position information of the air conditioner O50C, and provides the extracted position information to the determination unit O83.

The determination unit O83 determines whether or not the position information received from the registered-coordinate unit O82 is to be reference coordinates, based on the accuracy identifier O54 of the RF-ID device O50 received from the coordinate accuracy identification information O63.

FIG. 191 illustrates processing performed by the determination unit O83 based on each accuracy identifier.

Regarding the accuracy identifier O54, the RF-ID device O50 is previously assigned with an accuracy identifier for identifying each different product as illustrated in FIG. 191.

Here, the air conditioner O50C is assigned with the accuracy identifier O54 representing a "high" accuracy.

If the determination unit O83 determines that the position information of the mobile device O60 is to be corrected, then the determination unit O83 provides the position information received from the registered-coordinate unit O82 to the reference coordinate unit O84.

Here, if the accuracy identifier O54 represents a "low" accuracy, then the mobile device O60 determines that it is not necessary to correct the position information of the mobile device O60. Then, the mobile device O60 notifies the determination result to the first server O101. The first server stores the new position information of the air conditioner O50C into the registered-coordinate information unit. Thereby, the processing is completed.

If there is a trigger from the RF-ID detection unit O75, the reference coordinate unit O84 provides the position information received from the registered-coordinate unit O82 to the position correction unit O93.

The position information correction unit O93 corrects the current position information of the mobile device O60 based on the position information received from the reference coordinate unit O84.

Next, the mobile device O60 notifies the first server O101 of that the position information is completed. Thereby, the processing is completed.

As described above, (a) the position information indicated in the building coordinate information is compared to (b) the position information generated by the mobile device O60. Thereby, it is possible to determine whether or not (b) the position information generated by the mobile device O60 is deviated from a correct position. As a result, the position information of the mobile device O60 can be corrected, thereby preventing unnecessary updating of the position information.

Furthermore, products which are usually not moved from an initial equipped location are designated in a group of products having a high accuracy of the position coordinates. Thereby, reliability of the accuracy can be improved.

If even position information of a product in the group having a high accuracy is deviated from a correct position more than predetermined times, it is possible not to correct the position information newly generated by the mobile device O60, but to correct the position information registered in the registered-coordinate information unit O102.

It should be noted that it has been described that the mobile device O60 determines, based on the accuracy identifier, whether or not the position information is to be corrected. However, the accuracy identifier may be transmitted to the first server O101 so that the first server O101 determines the necessity of the correction.

Next, the description is given for processing performed by the mobile device O60 to manage relative positions of the products.

Here, product registration is first performed for the TV O50A. Then, with reference to the position information of the TV O50A as a reference point, relative position information is generated for the BD recorder O50B that is registered next.

When the mobile device O60 receives, via the antenna O61, the product ID O51, the first server URL O52, the service ID O53, and the accuracy identifier O54 from the RF-ID device O50 of the TV O50A, the RF-ID unit O62 in the mobile device O60 demodulates these pieces of information. The coordinate information sending unit O79 in the mobile device O60 provides the recording unit O80 with the position information determined in detecting the RF-ID device O50.

In receiving the position information, the recording unit O80 records the received position information onto the position information storage unit O73.

After that, in the same product registration processing as described earlier, the mobile device O60 registers the product information of the TV O50A into the first server O101.

Next, the mobile device O60 registers product information of the BD recorder O50B.

When the mobile device O60 receives, via the antenna O61, the product ID O51, the first server URL O52, the service ID O53, and the accuracy identifier O54 from the RF-ID device O50 of the BD recorder O50B, the RF-ID unit O62 in the mobile device O60 demodulates these pieces of information.

The coordinate information sending unit O79 in the mobile device O60 provides the recording unit O80 with the position information determined in detecting the RF-ID device O50 of the BD recorder O50B.

The recording unit O80 does not record the position information of the BD recorder O50B onto the position information storage unit O73, because the position information of the TV O50A has already been recorded.

In receiving the position information from the coordinate information sending unit O79, the relative position calculation unit O78 obtains the position information of the TV O50A from the position information storage unit O73 via the reproducing unit O77.

Next, the relative position calculation unit O78 calculates relative position information of the BD recorder O50B which is with respect to a reference position (or a reference point) that is the position information of the TV O50A obtained via the reproducing unit O77. Then, the relative position calculation unit O78 stores the calculation result into the position information recording unit.

By the above-described processing, it is possible to generate relative position information of a product with reference to a position of a different certain product.

It should be noted that it has been described that relative position information is stored in the mobile device (position information storage unit O73). However, the present invention is not limited to the above. It is also possible that the mobile device O60 transmits relative position information to the first server O101 that manages the received relative position information in the registered-coordinate information unit O102.

It should also be noted that it has been described that the position information of the TV O50A for which product registration is performed at the first time is set to be the reference position. However, the present invention is not limited to the above.

For example, a position predetermined by the user may be set to be the reference point (reference position). For instance, the reference point may be a position of an entrance of a building. If the mobile device O60 is a remote controller terminal of a TV, a position of the TV may be the reference point.

FIGS. 191 and 192 illustrate examples of processing of a 3D map according to this embodiment.

In this embodiment, the position information storage unit O73 in the mobile device O60 holds relative position information. However, the present invention in not limited to the above. For example, the following aspect is also possible. The coordinate information sending unit O79 in the mobile device O60 provides position information generated by the mobile device O60 to the recording unit O80 every time the position information is generated. The recording unit O80 thereby records the position information onto the position information storage unit O73. The position information storage unit O73 accumulates the position information generated by the mobile device O60. In this aspect, the program execution unit O65 generates trajectory information of the mobile device O60 from pieces of the position information accumulated in the position information storage unit O73. Thereby, a travel of the mobile device O60 can be estimated form the trajectory information.

It should be noted that it has been described in this embodiment that the processing of the determination unit O83 is performed based on the two kinds of accuracy identifiers in FIG. 191. However, the present invention is not limited to the above. For example, the following is also possible. Two or more kinds of product classification are set. A threshold value is defined for each kind of the classification to represent a different size of deviation from the position information. Based on the threshold value, the determination unit O83 determines whether or not to correct the position information of the mobile device O60.

It should also be noted that this embodiment may be combined with any other embodiments of the present invention. For example, it is also possible that the function of the communication device M1101S according to Embodiment 15 is provided to a product having the RF-ID device O50, and the 3D map (3D product map) as well as home ID are shared among products within the same house. In this aspect, each product obtains the 3D map beforehand from the mobile device O60 using the NFC function.

It should also be noted that it has been described in this embodiment that the RF-ID device O50 is provided to TVs, BD recorders, air conditioners, and the like. FIG. 194 illustrates a system including products O50G to O50N each having the RF-ID device O50. Each of the products O50G to O50N also includes a specific small power wireless communication device (for example, ZigBee), which enables the products to directly communicate with each other within a range in which radio waves can be received. It is assumed that each of the products O50G to O50N has already obtained a 3D map from the mobile terminal O60 via the RF-ID device O50. The 3D map shows an arrangement of the products O50G to O50N. Or, for another method, each of the products O50G to O50N may have the communication antenna O68 in order to obtain, via the internet, the 3D map showing the product arrangement.

The following describes the situation where a product O50H transmits data to a product O50K by using the specific small power wireless communication device. The specific small power wireless communication device usually operates at a sleep mode in terms of power saving. At the sleep mode, a power source of the specific small power wireless communication device is switched ON or OFF at regular intervals. Here, timings of switching ON or OFF for the products are in synchronization with each other.

When the product O50H needs to transmit data, the specific small power wireless communication device in the product O50H is switched to an awake mode. At the awake mode, the power source of the specific small power wireless communication device is always ON.

The product O50H examines the 3D map showing the arrangement of the products O50G to O50N, which has previously been obtained. From the 3D map of the product arrangement, the product O50H determines products located between the product O50H and the product O50K. In this example, a product O50J is determined from the 3D map to be a relay product to relay data.

The product O50H instructs the product O50J to switch to the awake mode.

The product O50H transmits, to the product O50J, data addressed to the product O50K.

When the product O50J receives the data addressed to the product O50K, the product O50J transfers the data to the O50K. Then, the product O50J is switched to the sleep mode.

As described above, using the 3D map, the product O50H determines a relay product in order to transmit data, and causes only the determined relay product (product O50J) to be switched to the awake mode. Thereby, other products, which do not need to be at the awake mode, do not need to be switched to the awake mode. Without the 3D map, in order to establish a path to the product O50K, the product O50H needs to cause all products to be switched to search for the path.

It should also be noted that the units included in each of the above-described embodiments may be implemented into a Large Scale Integration (LSI) that is typically an integrated circuit. These units may be integrated separately, or a part or all of them may be integrated into a single chip. Here, the integrated circuit is referred to as a LSI, but the integrated circuit can be called an IC, a system LSI, a super LSI or an ultra LSI depending on their degrees of integration. The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

[Embodiment 19]

This embodiment relates to a system including: a terminal apparatus (device, appliance) having a proximity wireless communication function; a mobile device that performs proximity wireless communication with the terminal apparatus; and a server device connected to the mobile device via a general-purpose network such as the Internet or a mobile phone communication network. In the system, the terminal apparatus can be operated by the mobile device when the mobile device points to the terminal apparatus, through the use of sensor information or the like of the mobile device. The system is described in detail below, with reference to drawings.

(Overall System Structure)

FIG. 195 is a schematic diagram showing an overall communication system according to this embodiment. A communication system 100 shown in FIG. 195 includes a terminal apparatus 101, a mobile device 102, and a server device 104.

The terminal apparatus 101 and the mobile device 102 can communicate with each other by using proximity wireless communication. Here, the proximity wireless communication in this embodiment is assumed to be (1) communication between a Radio Frequency Identification (RF-ID) tag (ISO 14443) and a reader/writer, which is performed by electromagnetic induction of 13.56 MHz band (High Frequency (HF) band), radio waves between 52 MHz to 954 MHz band (Ultra High Frequency (UHF) band), or the like, or (2) communication of Near Field Communication (NFC) (ISO/IEC 21481) of 13.56 MHz band. Since the communication distance is typically limited to several tens of centimeters in the HF band and several centimeters in the UHF band, communication is established by holding the mobile device over the terminal apparatus (or touching the mobile device to the terminal apparatus).

In this embodiment, the description is given for a structure in which the mobile device 102 has a reader/writer function and the terminal apparatus 101 has an IC tag function. However, this embodiment is applicable to any structure so long as the terminal apparatus 101 and the mobile device 102 can exchange information using proximity wireless communication. That is, a structure in which the mobile device 102 has an IC tag function and the terminal apparatus 101 has a reader/writer function is also included within the scope of the present invention. Moreover, for the NFC, a peer-to-peer (P2P) communication function, a card emulation, and a reader/writer emulation have been standardized. These functions make no difference which device/apparatus should have an IC tag or a reader/writer. For the sake of simplicity in the description, it is assumed in this embodiment that the mobile device 102 has a reader/writer function and the terminal apparatus 101 has an IC tag function.

The terminal apparatus 101 includes a controller 105, a main memory 106, a proximity wireless communication unit 107, and an antenna 108.

The controller 105 is, for example, a CPU which is a system controller of the terminal apparatus 101. The controller 105 performs system control at least for the terminal apparatus 101 other than the proximity wireless communication unit 107.

The main memory 106 is a memory capable of storing control software for operation in the controller 105 and various data sensed in the terminal apparatus 101, and is typically implemented in LSI of the controller 105 (though the main memory 106 may instead be provided as an external memory). For example, the main memory 106 is a RAM, a nonvolatile memory, or the like.

The proximity wireless communication unit 107 performs communication with the reader/writer in the mobile device 102. The proximity wireless communication unit 107 modulates data to be transmitted to the reader/writer, and demodulates data transmitted from the reader/writer. In addition, the proximity wireless communication unit 107 generates power from radio waves received from the reader/writer in order to establish at least proximity wireless communication, and also extracts clock signals from the received radio waves. At least the proximity wireless communication unit 107 in the terminal apparatus 101 is thereby operated by the power and clock generated from the radio waves from the reader/writer. Therefore, the proximity wireless communication unit 107 can perform proximity wireless communication with the mobile device 102 even if a main power of the terminal apparatus 101 is OFF.

The antenna 108 is a loop antenna for the proximity wireless communication with the reader/writer in the mobile device 102.

The mobile device 102 includes an antenna 109, a display unit 110, and keys 111.

The antenna 109 is an antenna for the proximity wireless communication with the terminal apparatus 101. The mobile device 102 performs polling towards the IC tag on the terminal apparatus 101. When the communication with the terminal apparatus 101 is established, the mobile device 102 reads information from the terminal apparatus 101 or writes information into the terminal apparatus 101.

The display unit 110 displays the result of proximity wireless communication between the mobile device 102 and the terminal apparatus 101 and data transmitted from the server device 104. For example, the display unit 110 is a liquid crystal display or the like.

The keys 111 are an interface for the user to operate the mobile device 102. A structure in which the display unit 110 is a touch panel and therefore also serves as the keys 111 is applicable, too.

The mobile device 102 activates the proximity wireless communication unit in the mobile device 102 according to the user's input by the keys 111. After the activation, the mobile device 102 starts polling for proximity wireless communication to the terminal apparatus 101. In general, polling keeps emitting radio waves to unspecified receivers. Therefore, the mobile device 102 driven by a battery is under load in terms of battery duration. In view of this, the mobile device 102 may be provided with a dedicated button for polling. This prevents unnecessary polling, and also alleviates the user's load in operating the device.

The server device 104 is a server having a database. The server device 104 is typically implemented as a Web server having a database. The server device 104 is connected to the mobile device 102 via the Internet 103. The server device 104 registers, onto the database, information transferred from the mobile device 102, and transfers, to the mobile device 102, information indicating the result. The display unit 110 of the mobile device 102 displays the received information.

With the system structure described above, information sensed in the terminal apparatus 101 can be registered in the database in the server device 104 via the mobile device 102. For example, the terminal apparatus 101 transfers information for uniquely identifying the terminal apparatus, such as a product serial number, a model number, or manufacturer identification information, to the mobile device 102 using proximity wireless communication. The mobile device 102 transfers the information received from the terminal apparatus 101 via proximity wireless communication, information stored in the mobile device 102 (e-mail address, phone number, mobile terminal identification information, or SIM card ID) for specifying the user or the mobile device 102 itself, and information (GPS information, A-GPS information, position information estimated from a base station in a mobile network, etc.) for specifying a position of the mobile device 102 in the case where the mobile device 102 is capable of sensing position information, to the server device 104. The server device 104 registers these information in the database. The series of operations can eliminate the user's load of inputting various information. In other words, the user can substantially perform user registration and the like for the terminal apparatus 101 merely by holding the mobile device 102 over the terminal apparatus 101.

Moreover, transmitting trouble occurrence state information or use history information as the sensed information of the terminal apparatus 101 allows the manufacturer to promptly determine and deal with an initial failure of a specific lot. Moreover, the structure offers advantages to the manufacturer that can specify functions used by each user from the use history information and use the specified information for next product development.

(Structure of Mobile Device)

The following describes the mobile device 102 according to this embodiment in detail, with reference to drawings.

FIG. 196 is a block diagram showing a structure of the mobile device 102 according to this embodiment.

The mobile device 102 includes a proximity wireless communication unit 201, a proximity wireless detection unit 202, an apparatus information obtainment unit 203, an external communication unit 204, a sensor unit 205, a position sensing unit 206, a direction sensing unit 207, a directional space obtainment unit 208, an apparatus specification unit 209, a movement determination unit 210, an operation information setting unit 211, a remote control information obtainment unit 212, a storage unit 213, a display information decision unit 214, an operation information transmission unit 215, an operation history obtainment unit 216, and a sound sensor 217.

The proximity wireless communication unit 201 demodulates information received by the antenna 109 and modulates information to be transmitted via the antenna 109.

The proximity wireless detection unit 202 detects information demodulated by the proximity wireless communication unit 201.

The apparatus information obtainment unit 203 obtains apparatus information which is information regarding the terminal apparatus 101, from the information detected by the proximity wireless detection unit 202.

The external communication unit 204 includes a communication antenna 219, a receiving unit 220, a transmission unit 221, and a communication control unit 222.

The communication antenna 219 is connected to a general-purpose network such as the Internet.

The transmission unit 221 modulates data to be transmitted to the outside via the general-purpose network such as the Internet.

The receiving unit 220 demodulates data received via the general-purpose network such as the Internet.

The communication control unit 222 generates and analyzes data communicated with other devices/apparatuses via the general-purpose network such as the Internet.

The sensor unit 205 includes an acceleration sensor 223, a Global Positioning System (GPS) sensor 224, an angular velocity sensor 225, and an orientation sensor 226.

The acceleration sensor 223 measures an acceleration of the mobile device 102.

The GPS sensor 224 obtains GPS information, and thereby calculates position information of the mobile device 102.

The angular velocity sensor 225 measures an angular velocity of the mobile device 102.

The orientation sensor 226 measures an orientation.

The position sensing unit 206 includes an absolute position obtainment unit 227, a relative position obtainment unit 228, and a position setting unit 229.

The absolute position obtainment unit 227 obtains, as an absolute position of the mobile device 102, (a) the position information generated by the GPS sensor 224 or (b) position information provided from a server via the external communication unit 204.

The relative position obtainment unit 228 integrates the acceleration measured by the acceleration sensor 223 and the angular velocity measured by the angular velocity sensor 225, thereby calculating a relative position of the mobile device 102 with respect to an initial setting value.

The position setting unit 229 calculates a current position of the mobile device 102 based on the absolute position obtained by the absolute position obtainment unit 227 and the relative position generated by the relative position obtainment unit 228.

The direction sensing unit 207 calculates a pointing direction of the mobile device 102, based on the angular velocity measured by the angular velocity sensor 225 and the orientation measured by the orientation sensor 226.

The directional space obtainment unit 208 obtains directional space information indicating a directional space to which the mobile device 102 is pointed, based on the position information of the mobile device 102 calculated by the position sensing unit 206 and the pointing direction calculated by the direction sensing unit 207.

The remote control information obtainment unit 212 obtains, via the external communication unit 204, remote control information for controlling the terminal apparatus 101, which is received from the server device 104.

The storage unit 213 stores the remote control information of the terminal apparatus 101 obtained by the remote control information obtainment unit 212 and the position information at the time of detection of proximity wireless communication obtained by the position sensing unit 206, in association with each other.

The apparatus specification unit 209 specifies the terminal apparatus 101 located in the direction pointed by the mobile device 102, based on the directional space information obtained by the directional space obtainment unit 208 and the position information of the terminal apparatus 101 stored in the storage unit 213.

The movement determination unit 210 determines whether or not the mobile device 102 is still, based on the sensor information measured by the sensor unit 205.

The remote control information setting unit 211 obtains, from the storage unit 213, the remote control information of the terminal apparatus 101 specified by the apparatus specification unit 209, and sets the remote control information in the mobile device 102.

The display information decision unit 214 decides a remote control interface displayed on the display unit 110, based on the remote control information set by the remote control information setting unit 211.

The operation information transmission unit 215 transmits, when the user of the mobile device 102 presses any of the keys 111, a remote control command of the terminal apparatus 101 corresponding to the pressed key 111, to the terminal apparatus 101.

The operation history obtainment unit 216 obtains information of the remote control command transmitted by the operation information transmission unit 215, thus obtaining the user's operation history of the terminal apparatus 101.

The sound sensor 217 senses sound around the mobile device 102. For example, the sound sensor 217 is a microphone.

With the above structure, it is possible to store the terminal apparatus information, the position of the terminal apparatus 101, and the remote control information of the terminal apparatus 101 in the storage unit 213 in association with each other. It is also possible to calculate the direction pointed by the mobile device 102 using the sensor information, call the remote control information of the terminal apparatus 101 existing in the calculated directional space from the storage unit 213, and set the remote control command of the mobile device 102 based on the remote control information of the terminal apparatus 101. For example, merely by pointing the mobile device 102 to a home appliance such as an air conditioner or a TV which the user of the mobile device 102 wants to operate, the user can operate the pointed home appliance with the mobile device 102.

Moreover, the movement determination unit 210 determines whether or not the mobile device 102 is still. Such detection of the still state of the mobile device 102 can be used as a trigger to set the mobile device 102 as a remote controller of the terminal apparatus 101 in the direction pointed by the mobile device 102. Thus, the mobile device 102 can be set as a remote controller without the user's key operation or the like.

Besides, the pointing direction of the mobile device 102 can be obtained by the direction sensing unit 207. Accordingly, in the case where, when operating the terminal apparatus 101 using the mobile device 102 via infrared communication, the direction of infrared communication deviates from the terminal apparatus 101, a warning message such as "Please direct the mobile device 102 slightly to the right" can be presented to the user.

In addition, the sound information of the terminal apparatus 101, such as sound generated upon channel switching in the case of a TV or reaction sound notifying the user of successful reception of remote control information in the case of an air conditioner or the like, can be obtained by the sound sensor 217. This enables the mobile device 102 to recognize whether or not the operation command is successfully delivered, with no need for transmission of a specific feedback signal indicating that the signal is received by the terminal apparatus 101. Hence, even when the terminal apparatus 101 is not connected to a general-purpose network, proper operation history of the terminal apparatus 101 can be collected from the terminal apparatus 101 via the mobile device 102.

Furthermore, the detection of the terminal apparatus 101 by the proximity wireless detection unit 202 is used as a trigger to initialize the relative position information obtained by the relative position obtainment unit 228 and set the absolute position information in the absolute position obtainment unit 227 to position information obtainable from the apparatus information or via the GPS sensor 224 or the external communication unit 204. An accumulation error of position information caused when correcting the position information using the acceleration sensor 223 can be reduced in this way.

(Details of Apparatus Specification Unit)

The following describes the apparatus specification unit 209 according to this embodiment in more detail.

(a), (b), and (c) in FIG. 197 are each a block diagram showing a structure of the apparatus specification unit 209 according to this embodiment.

In (a) in FIG. 197, the apparatus specification unit 209 includes an apparatus number determination unit 301, an apparatus direction calculation unit 302, a difference calculation unit 303, and an apparatus decision unit 304.

The apparatus number determination unit 301 determines the number of terminal apparatuses 101 existing in the directional space, from the pointing direction of the mobile device 102 calculated by the directional space obtainment unit 208 and the position information of each terminal apparatus 101 stored in the storage unit 213.

The apparatus direction calculation unit 302 calculates a distance between each terminal apparatus 101 determined by the apparatus number determination unit 301 and the mobile device 102, or a direction angle of each terminal apparatus 101 determined by the apparatus number determination unit 301.

The difference calculation unit 303 calculates a difference between the direction angle of each terminal apparatus 101 calculated by the apparatus direction calculation unit 302 and a direction angle indicating the direction pointed by the mobile device 102.

The apparatus decision unit 304 selects a terminal apparatus 101 corresponding to a minimum difference calculated by the difference calculation unit 303, as the terminal apparatus for which the remote control information is set.

In (b) in FIG. 197, the apparatus specification unit 209 includes the apparatus number determination unit 301, a space information storage unit 305, and an apparatus decision unit 306.

The space information storage unit 305 stores room arrangement and coordinate information of a building in which the terminal apparatus 101 exists.

The apparatus decision unit 306 decides the apparatus, based on the room arrangement information obtained from the space information storage unit 305. For example, in the case where only one terminal apparatus from among the terminal apparatuses determined by the apparatus number determination unit 301 exists in the same room as the mobile terminal, the apparatus decision unit 306 selects the terminal apparatus as the terminal apparatus for which the remote control information is set.

In (c) in FIG. 197, the apparatus specification unit 209 includes the apparatus number determination unit 301, an apparatus candidate display unit 307, a user input receiving unit 308, an apparatus decision unit 309, and a pitch angle detection unit 310.

The apparatus candidate display unit 307 outputs a candidate terminal apparatus list of the terminal apparatuses 101 determined by the apparatus number determination unit 301 to the display unit 110, based on the pitch angle detection unit 310.

The user input receiving unit 308 receives the user's selection of a terminal apparatus 101 made by a key operation from the candidate terminal apparatus list outputted by the apparatus candidate display unit 307.

The apparatus decision unit 309 selects the terminal apparatus 101 received by the user input receiving unit 308, as the terminal apparatus 101 for which the remote control information is set.

The pitch angle detection unit 310 detects a pitch angle of the mobile device 102 when the terminal apparatus 101 for which the remote control information is set is selected.

The apparatus pitch angle storage unit 311 stores the pitch angle detected by the pitch angle detection unit 310 and the terminal apparatus 101 selected by the apparatus decision unit 309 in association with each other.

With the structure shown in (a) in FIG. 197, in the case where a plurality of terminal apparatuses 101 exist in the directional space obtained by the directional space obtainment unit 208, a terminal apparatus 101 in a direction closest to the direction pointed by the mobile device 102 can be selected through the use of the difference calculation unit 303.

With the structure shown in (b) in FIG. 197, in the case where a plurality of terminal apparatuses 101 exist in the directional space obtained by the directional space obtainment unit 208, the room arrangement information of the building can be obtained and so the terminal apparatus 101 for which the remote control information is set can be limited to a terminal apparatus 101 in a space where the mobile device 102 exists.

With the structure shown in (c) in FIG. 197, the terminal apparatus 101 selected by the user and the pitch angle information are stored in association with each other. Accordingly, in the case where a plurality of terminal apparatuses 101 exist in the directional space obtained by the directional space obtainment unit 208, the terminal apparatuses 101 outputted by the apparatus candidate display unit 307 can be narrowed down based on the pitch angle information.

(Storage Unit in Mobile Device 102)

The following describes an example of the storage unit 213 according to this embodiment.

FIG. 198 is a table showing an example of a data structure of the storage unit 213 according to this embodiment.

As shown in FIG. 198, the storage unit 213 stores a product serial number, a product number, position information, and remote control information in association with one another. Here, the storage unit 213 has a product serial number storage region, a product number storage region, a position information storage region, and a remote control information storage region.

The product serial number storage region holds a product serial number for uniquely identifying a registered terminal apparatus 101.

The product number storage region holds a product number for identifying a product type of the terminal apparatus 101.

The position information storage region holds position information corresponding to the terminal apparatus 101. For example, the position information storage region holds longitude and latitude of a position of the terminal apparatus 101, and room information, such as a living room or a kitchen, where the terminal apparatus 101 exists.

The remote control information storage region holds remote control information corresponding to the terminal apparatus 101. The remote control information includes (a) operation information corresponding to the terminal apparatus 101 and (b) display information in which each of the keys 111 is in association with a corresponding operation command in the operation information.

The operation information includes (a) operations of the terminal apparatus 101, such as power ON and power OFF, and (b) operation commands each of which is to be transmitted from the mobile device 102 to execute a corresponding one of the operations, in association with each other. It should be noted that the operation indicated in the operation information may include a plurality of operations, and is not limited to one kind of operation of the terminal apparatus 101. For example, one operation indicated in the operation information may be a series of operations of the terminal apparatus 101, such as powering ON, opening of a recording list, selection of a specific TV program, and reproduction of the selected TV program.

(Method of Determining Directional Space of Mobile Device 102)

The following describes an example of a method of obtaining the directional space by the directional space obtainment unit 208 according to this embodiment.

FIG. 199 is a graph showing an example of the method of obtaining the directional space by the directional space obtainment unit 208 according to this embodiment.

In FIG. 199, coordinates x0 and y0 indicate the coordinate position of the mobile device 102, and are obtainable by the position sensing unit 206 in the mobile device 102.

"N", "S", "E", and "W" shown with the coordinate axes respectively indicate "north", "south", "east", and "west", and are obtainable by the orientation sensor 226 in the mobile device 102.

An angle θ indicates the direction angle of the mobile device 102 with respect to the coordinate axis, and is obtainable by the angular velocity sensor 225 in the mobile device 102.

An angle α is a threshold for defining a directional space range. The directional space is larger when the angle α is larger, and smaller when the angle α is smaller. The angle α may be preset in the mobile device 102, or set by user input. Moreover, the angle α may be set based on a building size, a room size, a distance between a wall and the mobile device 102, and the like.

In FIG. 199, the directional space is expressed by $(x-x0)*\tan(\theta-\alpha)+y0<y<(x-x0)*\tan(\theta+\alpha)+y0$. The mobile device 102 selects a terminal apparatus 101 existing in the directional space, based on the position information stored in the storage unit 213.

(Remote Control Information Registration Flow)

First, the description is given for a flow of registering remote control information into the storage unit 213 of the mobile device 102 according to this embodiment.

FIG. 200 is a flowchart showing process flow of registering remote control information into the storage unit 213 of the mobile device 102 according to this embodiment.

In S601, the user activates a reader/writer application for proximity wireless communication.

In S602, the mobile device 102 transmits a polling radio wave which is a signal calling unspecified receivers, via the antenna 109.

In S603, the mobile device 102 determines whether or not a polling response from the terminal apparatus 101 can be detected.

In the case of determining in S603 that the polling response cannot be detected, the mobile device 102 transmits the polling radio wave again.

In the case of determining in S603 that the polling response can be detected, the mobile device 102 transmits an apparatus information request for obtaining apparatus information of the terminal apparatus 101 (S604).

In S605, the mobile device 102 receives the apparatus information from the terminal apparatus 101.

In S606, the mobile device 102 determines whether or not position information of the terminal apparatus 101 can be obtained from the apparatus information.

In the case of determining in S606 that the position information can be obtained, the mobile device 102 holds the position information as the absolute position information obtained by the absolute position obtainment unit 227 and initializes the relative position information obtained by the relative position obtainment unit 228 in S607.

In the case of determining in S606 that the position information cannot be obtained, the mobile device 102 activates the GPS sensor 224 in S608, and obtains the absolute position information and initializes the relative position information obtained by the relative position obtainment unit 228 in S609.

In S610, the mobile device 102 determines whether or not operation information corresponding to the apparatus information obtained in S605 is stored in the storage unit 213.

In the case of determining in S610 that the operation information is stored, the processing ends.

In the case of determining in S610 that the operation information is not stored, the mobile device 102 transmits a request for operation information corresponding to the apparatus information to the server via the external communication unit 204 in S611.

In S612, the mobile device 102 receives the operation information from the server.

In S613, the mobile device 102 stores the operation information received in S612 and the position information obtained in S607 or S609, in the storage unit 213 in association with each other.

(Remote Control Information Setting Operation Flow)

The following describes processing of setting remote control information in the mobile device 102 to serve as a remote controller of a target apparatus, according to this embodiment.

FIGS. 201A and 201B are each a flowchart showing process flow of setting remote control information in the mobile device 102 and operating the mobile device 102 as a remote controller according to this embodiment.

FIG. 201A shows process flow in which the user operates the mobile device 102 to activate a remote control application. FIG. 201B shows process flow in which the remote control application is automatically activated without the user's key operation.

First, in FIG. 201A, the mobile device 102 starts the remote control application according to the user's key operation (S701).

In S702, the mobile device 102 obtains the user's selection of the terminal apparatus 101 made by a key operation.

In S703, the mobile device 102 sets operation information corresponding to the terminal apparatus 101 selected in S702, in the mobile device 102.

In S704, the mobile device 102 activates the sensor unit 205, and starts detection by the position sensing unit 206 and the direction sensing unit 207.

In S705, the mobile device 102 calculates a relative position by the relative position obtainment unit 228.

In S706, the mobile device 102 transmits a remote control command for operating the terminal apparatus 101, based on a remote control operation inputted by the user through the keys 111 (detailed flow will be described later).

In S707, the mobile device 102 determines whether or not the mobile device 102 is still, by the movement determination unit 210.

In the case of determining in S707 that the mobile device 102 is not still, the mobile device 102 returns to S705 to calculate the relative position information again.

In the case of determining in S707 that the mobile device 102 is still, the mobile device 102 proceeds to S708 to obtain position information and pointing direction information respectively by the position sensing unit 206 and the direction sensing unit 207.

In S709, the mobile device 102 specifies the terminal apparatus 101 existing in the direction pointed by the mobile device 102, and sets remote control information (detailed flow will be described later).

FIG. 201B is described next.

First, in S710, the mobile device 102 activates the sensor unit 205, and starts detection by the position sensing unit 206 and the direction sensing unit 207.

In S711, the mobile device 102 calculates a relative position by the relative position obtainment unit 228.

In S712, the mobile device 102 determines whether or not the mobile device 102 is still, by the movement determination unit 210.

In the case of determining in S712 that the mobile device 102 is not still, the mobile device 102 returns to S711 to calculate the relative position information again.

In the case of determining in S712 that the mobile device 102 is still, the mobile device 102 proceeds to S713 to activate the remote control application.

In S714, the mobile device 102 obtains position information and pointing direction information by the position sensing unit 206 and the direction sensing unit 207.

In S715, the mobile device 102 specifies the terminal apparatus 101 existing in the direction pointed by the mobile device 102, and sets remote control information (detailed flow will be described later).

In S716, the mobile device 102 transmits a remote control command for operating the terminal apparatus 101, based on a remote control operation inputted by the user through the keys 111 (detailed flow will be described later).

According to the process in FIG. 201B, remote control information can be set in the mobile device 102 without the user's key operation.

(Remote Control Information Setting Operation Flow)

The following describes flow of the process (S709, S715) of specifying the terminal apparatus 101 existing in the direction pointed by the mobile device 102 according to this embodiment.

FIG. 202 is a flowchart showing flow of the process of specifying the terminal apparatus 101 existing in the direction pointed by the mobile device 102 according to this embodiment.

First, in S801, the mobile device 102 sets a search range, where a search range angle is denoted by $\alpha$.

Next, in S803, the mobile device 102 determines whether or not there is any terminal apparatus 101 satisfying $(x-x0)*\tan(\theta-\alpha)+y0<y<(x-x0)*\tan(\theta+\alpha)+y0$, using the position information (x0, y0) and the pointing direction information $\theta$ of the mobile device 102.

In the case of determining in S803 that such a terminal apparatus 101 exists, the mobile device 102 proceeds to S804 to determine whether or not there is one terminal apparatus 101 in the directional space.

In the case of determining in S804 that there is one terminal apparatus 101 in the directional space, the mobile device 102 proceeds to S810 to set remote control information of the terminal apparatus 101. The mobile device 102 then ends the procedure.

In the case of determining in S804 that there is not only one terminal apparatus 101, the mobile device 102 proceeds to S805 to obtain room arrangement information from the space information storage unit 305.

In S806, the mobile device 102 determines whether or not there is one terminal apparatus 101 satisfying conditions that the terminal apparatus 101 exists in a room in which the mobile device 102 exists and also in the directional space, using the room arrangement information and the directional space obtained in S803.

In the case of determining in S806 that there is one terminal apparatus 101, the mobile device 102 proceeds to S810 to set remote control information of the terminal apparatus 101. The mobile device 102 then ends the procedure.

In the case of determining in S806 that there is not only one terminal apparatus 101, the mobile device 102 proceeds to S807 to display, on the display unit 110, a list of terminal apparatuses 101 satisfying the conditions in S806, as an apparatus candidate list.

Next, in S808, the mobile device 102 receives the user's selection of a terminal apparatus 101 made through the keys 111 from the apparatus candidate list.

In S809, the mobile device 102 obtains pitch angle information by the pitch angle obtainment unit 310, and stores the terminal apparatus 101 selected in S808 and the pitch angle information in association with each other.

In the case of determining in S803 that there is no such terminal apparatus 101, the mobile device 102 proceeds to S811 to determine, using the position information, whether or not the mobile device 102 exists in a space, such as the user's home, where an operation terminal apparatus (terminal apparatus to be operated) exists. Though the user's home is used here as an example of the space where the operation terminal apparatus exists, the present invention is not limited to this.

In the case of determining in S811 that the terminal apparatus 101 exists in the space where the operation terminal apparatus exists, the mobile device 102 proceeds to S816 to output a warning to register the terminal apparatus 101, such as "Not registered. Please touch it", to the display unit 110.

In the case of determining in S811 that the terminal apparatus 101 does not exist in the space where the operation terminal apparatus exists, the mobile device 102 proceeds to S812 to obtain position information such as the latitude and longitude of the user's home.

In S813, the mobile device 102 determines whether or not the mobile device 102 is pointed to the user's home, based on the position information of the home and the pointing direction information and the position information of the mobile device 102.

In the case of determining in S813 that the mobile device 102 is not pointed to the user's home, the mobile device 102 ends the process.

In the case of determining in S813 that the mobile device 102 is pointed to the user's home, the mobile device 102 outputs a list of terminal apparatuses 101 operable via the Internet, such as terminal apparatuses connected to an external network, to the display unit 110.

Next, in S814, the mobile device 102 obtains the user's selection of a terminal apparatus 101 made through the keys 111 from the apparatus list.

In S810, the mobile device 102 sets remote control information of the terminal apparatus 101, and ends the process.

(Detailed Flow of Remote Control Operation)

The following describes flow of the process (S706, S716) of operating the terminal apparatus 101 using the mobile device 102 as a remote controller according to this embodiment.

FIG. 203 is a flowchart showing flow of the process of operating the terminal apparatus 101 using the mobile device 102 as a remote controller according to this embodiment.

First, in S901, the mobile device 102 determines whether or not there is a command input from the user through the keys 111.

In the case of determining in S901 that there is no command input, the mobile device 102 ends the process.

In the case of determining in S901 that there is a command input, the mobile device 102 proceeds to S902 to determine whether or not the inputted command is a quit command for the application. In the case of determining in S902 that the inputted command is the quit command, the mobile device 102 ends the process.

In the case of determining in S902 that the inputted command is not the quit command, the mobile device 102 transmits the operation command to the terminal apparatus 101.

In S904 which follows, the mobile device 102 obtains sound information of the terminal apparatus 101 using the sound sensor 217 and determines, based on the sound information, whether or not the operation command is successfully received by the terminal apparatus 101. The sound information mentioned here is, for example, sound generated upon channel switching in the case of a TV, reaction sound notifying the user of successful reception of remote control information in the case of an air conditioner or the like, and so on.

In the case of determining in S904 that the operation command is successfully received, the mobile device 102 proceeds to S905 to transmit operation history of the terminal apparatus 101 to the server device 104 via the external communication unit 204. Note that the operation history may be stored in the storage unit 213 in the mobile device 102.

In S906 which follows, the mobile device 102 switches the screen of the display unit 110 in the mobile device 102 according to the operation command. For example, in the case of displaying a recorded TV program list on a TV, the recorded TV program list can also be displayed on the display unit 110 in the mobile device 102 held by the user.

In the case of determining in S904 that the operation command is not successfully received, the mobile device 102 proceeds to S907 to retransmit the operation command and determine whether or not a predetermined number of retransmissions is exceeded.

In the case of determining in S907 that the predetermined number of retransmissions is exceeded, the mobile device 102 proceeds to S908 to output a warning to the user to perform the key operation again, such as "Please input again", to the display unit 110.

(Remote Control Registration Sequence)

The following describes data exchange between the terminal apparatus 101, the mobile device 102, and the server device 104 when registering remote control information in the mobile device 102 according to this embodiment.

FIG. 204 is a sequence diagram showing data exchange between the terminal apparatus 101, the mobile device 102, and the server device 104 when registering remote control information in the mobile device 102 according to this embodiment.

First, the user activates an application for activating a reader/writer to perform proximity wireless communication in the mobile device 102, to start polling.

The user touches the mobile device 102 which has started polling, to a region of the terminal apparatus 101 where an antenna for proximity wireless communication is provided.

After the touch, the terminal apparatus 101 receives a polling radio wave from the mobile device 102.

Upon receiving the polling radio wave, the terminal apparatus 101 transmits a polling response signal to the mobile device 102, thus establishing proximity wireless communication between the terminal apparatus 101 and the mobile device 102.

Upon receiving the polling response signal from the terminal apparatus 101, the mobile device 102 generates a read command for reading apparatus information from the terminal apparatus 101, and transmits the read command to the terminal apparatus 101.

Upon receiving the read command, the terminal apparatus 101 transmits the apparatus information of the terminal apparatus 101 to the mobile device 102.

The mobile device 102 extracts the apparatus information from the information received from the terminal apparatus 101.

The mobile device 102 further obtains position information at the time of touch, using various sensor information of the GPS sensor and the like.

The reason for obtaining the position information at the time of touch is that the position information obtained by the mobile device 102 at the time of communication establishment can be regarded as the same as the position information of the terminal apparatus 101 on the ground that the mobile device 102 needs to be brought within a few centimeters of the terminal apparatus 101 in order to establish proximity wireless communication.

Next, the mobile device 102 transmits, to the server device 104, a remote control information request command for obtaining remote control information corresponding to the extracted apparatus information of the terminal apparatus 101 from the server device 104.

Upon receiving the remote control information request command, the server device 104 obtains the remote control information of the apparatus from a remote control information management database, and transmits the remote control information to the mobile device 102.

Lastly, the mobile device 102 stores the received remote control information, the position information, and the apparatus information in the storage unit 213 in association with each other.

(Remote Control Operation Sequence)

The following describes data exchange between the terminal apparatus 101, the mobile device 102, and the server device 104 when operating the terminal apparatus 101 using the mobile device 102 as a remote controller according to this embodiment.

FIG. 205 is a sequence diagram showing data exchange between the terminal apparatus 101, the mobile device 102, and the server device 104 when operating the terminal apparatus 101 using the mobile device 102 as a remote controller according to this embodiment.

First, the user inputs an operation command through the keys 111, based on a remote control interface displayed on the display unit 110.

The mobile device 102 transmits the operation command inputted by the user, to the terminal apparatus 101 via the operation information transmission unit 215.

The terminal apparatus 101 executes a program according to the received operation command, thereby executing an operation for power, volume, temperature, reproduction, or TV channel change.

The terminal apparatus 101 emits sound generated upon channel switching in the case of a TV, and reaction sound for notifying the user of successful reception of remote control information in the case of an air conditioner or the like.

The mobile device 102 transmits operation history of the terminal apparatus 101 to the server device 104, based on a status of recognition of the sound emitted from the terminal apparatus 101 by the sound sensor 217.

The mobile device 102 also switches the screen of the display unit 110 in the mobile device 102 according to the operation command.

The user inputs the operation command through the keys 111 again, based on the remote control interface displayed on the display unit 111.

The mobile device 102 transmits the operation command inputted by the user, to the terminal apparatus 101 via the operation information transmission unit 215.

Here, the mobile device 102 cannot recognize the sound emitted from the terminal apparatus 101 in the case where the operation command is not successfully received by the terminal apparatus 101. This enables the mobile device 102 to recognize whether or not the reception of the operation command is completed, with no need for transmission of a specific feedback signal indicating that the signal is successfully received by the terminal apparatus 101.

In such a case, the mobile device 102 retransmits the operation command.

After this, in the case of determining that the predetermined number of retransmissions is exceeded, the mobile device 102 outputs a warning to the user to perform the key operation again, such as "Please input again", to the display unit 110. The mobile device 102 then enters a state of waiting for the user to input the operation command.

Though this embodiment describes an example where the apparatus information of the terminal apparatus 101 is obtained using proximity wireless communication, the present invention is not limited to such. For instance, a bar-code including the apparatus information may be attached to the terminal apparatus 101, and read using an optical scanner of a digital camera or the like in the mobile device 102. FIG. 206 is a diagram showing an example of reading the apparatus information of the terminal apparatus 101 from a bar-code according to this embodiment. An air conditioner 1201 and a mobile device 1202 are shown in FIG. 206. The mobile device 1202 has the same structure as the mobile device 102, except that an optical scanner is included. A 2D bar-code 1203 including apparatus information is attached to the air conditioner 1201. The apparatus information of the 2D bar-code is obtained using the optical scanner of the mobile device 1202. In this way, even when the terminal apparatus 101 does not have a proximity wireless communication function, it is still possible to obtain the apparatus information of the terminal apparatus 101. Hence, the apparatus information can be obtained even in a situation where the terminal apparatus 101 is installed at a high place as in the case of an air conditioner and so it is difficult to touch the terminal apparatus 101 for establishing proximity wireless communication.

In the case where a plurality of terminal apparatuses 101 are situated in proximity and it is difficult for the apparatus specification unit 209 to specify one terminal apparatus 101 or in the case where the user wants to operate a plurality of terminal apparatuses 101 simultaneously, the plurality of terminal apparatuses 101 are operated using the mobile device 102. FIG. 207 is a diagram showing an example of operating a plurality of illumination apparatuses. In FIG. 207, display is made so that illumination switches operable on an illumination switch board can be operated simultaneously by pointing the mobile device 102 to the illumination switch board. For example, it is possible to set operation information for kitchen illumination and dining room illumination in the mobile device 102 and operate the two illumination apparatuses simultaneously, as shown in (a) in FIG. 207. Besides, if illumination intensity is analogously changeable as in the case of LED or the like, display may be made as shown in (b) in FIG. 207.

In the case where terminal apparatuses 101 such as a TV and a recorder are closely located, it is difficult to display all remote control commands of the terminal apparatuses 101 on the display unit 110 because the TV and the recorder each have a large number of remote control commands for operation. Accordingly, in the case where there are a large number of remote control commands, the display unit 110 performs display so that the user can select a terminal apparatus 101 for which the mobile device 102 is used as a remote controller. (a) in FIG. 208 is a diagram showing a display example for prompting the user to select a TV or a recorder. In (a) in FIG. 208, the mobile device 102 serves as a TV remote controller when setting of TV remote control is "ON", and a recorder remote controller when setting of recorder remote control is "ON".

In the case where the mobile device 102 is capable of obtaining the current operation status of the terminal apparatus 101, the mobile device 102 may set remote control information according to the current operation status. This makes it unnecessary to display all remote control commands, as a result of which the user interface can be simplified. For example, in the case of a TV or the like, the operation status may be obtained using a general-purpose network such as the Internet. (b) in FIG. 208 is a diagram showing an example of setting remote control information in the mobile device 102 according to the current operation status. In (b) in FIG. 208, it is assumed that the TV is ON and the recorder is OFF, and the mobile device 102 obtains this current operation status. Since there is at least no possibility of using a power ON command as a TV operation, the power ON command does not need to be included in TV remote control in the mobile device 102. Meanwhile, the recorder is OFF, and so a recorder remote control operation initially selected by the user is likely to be a power ON operation. Thus, remote control commands presented to the user can be narrowed down according to the operation status of the terminal apparatus 101.

Though this embodiment describes the case where the mobile device 102 calculates the directional space information of the mobile device 102 and specifies the terminal apparatus 101 existing in the pointing direction of the mobile device 102, the server device 104 may perform the specification. For example, the mobile device 102 transmits angular velocity information, acceleration information, and position information to the server device 104 via the external communication unit 204. The server device 104 specifies the terminal apparatus 101 existing in the pointing direction of the mobile device 102 based on the angular velocity information, the acceleration information, and the position information received from the mobile device 102, and transmits remote control information of the specified terminal apparatus 101 to the mobile device 102.

In this embodiment, altitude information of the mobile device 102 may be used, too. As an example, the altitude information of the mobile device 102 can be obtained using a barometer.

In this embodiment, a detection range of a remote controller for a terminal apparatus 101 such as a TV or an air conditioner may be variable depending on a degree of mobility, a degree of operation urgency, a size of the apparatus, or the like. For example, the reduction of a detection range for a terminal apparatus 101, such as an air conditioner, which is unlikely to be moved, can prevent false operation during operation of another terminal apparatus 101. On the other hand, the increase of a detection range of a remote controller for a terminal apparatus 101, such as a fan, which is likely to be moved, makes it possible to operate the terminal apparatus 101 even if the position of the terminal apparatus is changed to some extent.

Moreover, in the case where the terminal apparatus 101 is far from the mobile device 102, the range in which the mobile device 102 can operate the apparatus decreases. In view of this, the threshold α for defining the directional space range may be variable depending on the distance between the terminal apparatus 101 and the mobile device 102.

It is also possible for the user who is on the first floor of a building to operate a terminal apparatus 6002 on the second floor by pointing the mobile device 102, as shown in FIG. 209. In such a case where the terminal apparatus 101 exist on a different floor from the mobile device 102, the terminal apparatus 101 exists in a different room from the mobile device 102, or the operated apparatus is away from the mobile device 102 by a predetermined distance or more, a list of apparatuses in the room or the like may be displayed when pointing the mobile device 102. In so doing, it is possible to operate the terminal apparatus 101 at a remote location even when the user does not exactly remember the location of the terminal apparatus 101 in a next room or the like.

[Embodiment 20]

The following describes Embodiment 20 of the present invention. FIG. 210 is a diagram showing a home network environment assumed in this embodiment. This embodiment assumes a home network environment in which various home appliances are connected to a home appliance control device 5000 via a wireless communication device.

FIG. 211 is a diagram of a network module included in each home appliance. The network module includes a first wireless communication unit 5001 capable of proximity wireless communication such as NFC, and a second wireless communication unit 5002 capable of short-distance wireless communication such as ZigBee.

FIG. 212 is a functional block diagram of the home appliance control device. The home appliance control device includes a first wireless communication unit 5021 and a second wireless communication unit 5022, like each home appliance. Since there are cases where the home appliances employ different protocols in an upper layer 5025 even though they employ a standardized protocol in a physical layer 5023 and a MAC layer 5024, the home appliance control device holds protocols corresponding to a plurality of manufacturers or apparatuses. For instance, an apparatus 5026 performs authentication by using NFC, while an apparatus 5027 performs authentication by using buttons. Moreover, the home appliances may employ various short-distance wireless communication methods, such as Bluetooth and wireless LAN (802.11). In this case, the home appliances employ different protocols even for the physical layer and the MAC layer, and behave in these layers in the same manner as when they have different protocols for the upper layer.

FIG. 213 is a diagram showing user action when setting a solar panel. The solar panel according to this embodiment includes a plurality of panels each of which is capable of communicating with the home appliance control device. Here, the user is a person who establishes communication connection between the home appliance control device and the solar panel, such as an engineer for setting the solar panel or an engineer for setting the home appliance control device. First, the user near the home appliance control device switches a mode of the mobile terminal to an apparatus connection mode, and causes the mobile terminal to touch the home appliance control device (Step 1 in circle). In this description, "touching" means to perform communication by proximity wireless communication. Upon touch, the mobile terminal obtains, from the home appliance control device, a communication ID (such as a MAC address), an apparatus ID (such as a product serial number), an available communication protocol, information of a server connecting with the home appliance control device, an encryption key for a wireless communication path, and the like. The communication ID is provided to target home appliance(s) so that the target home appliance(s) can be connected to the home appliance control device. The apparatus ID is an ID necessary for the mobile terminal to perform inquiry to the server. It is assumed here that the home appliance control device and the mobile terminal can establish a secure path via the server for a predetermined time period by exchanging information with each other using proximity wireless communication. The secure path is assumed to be an encrypted communication path including another wireless path such as a path for cellular phones. The secure path via the server is used to update a secret key between the home appliance control device and the mobile terminal in order to provide the secret key to the home appliance. Pairing with a remotely-located apparatus such as a solar panel can be realized by providing a secret key which is effective for a long time. However, the security strength decreases if an effective secret key is issued, for example, on a day-to-day basis. The security strength further decreases in the case of successively performing setting at a remote location as in this embodiment. In this embodiment, however, a new secret key can be issued merely by pressing a button on the mobile terminal. This makes it possible to shorten the secret key effective time and maintain the security strength. In addition, when the mobile terminal keeps issuing new secret keys and also touches a plurality of home appliances to provide them with the secret keys, it is possible to sequentially perform authentication processes between (a) each of the home appliances far from the home appliance control device and (b) the home appliance control device. Here, the use of the above method is not limited to the wireless communication paring within the user's home. For example, the above method can also be used to perform paring between a home appliance in the user's home and a home appliance in a home of the user's relative or friend. Thereby, the user can easily perform pairing processing even if the target apparatuses are not in the home. Furthermore, the mobile terminal obtains position information using a six-axis sensor or GPS during movement (Steps 2 to 7 in circle). By transmitting, to the server, position information at the time of touching the solar panel, three-dimensional (3D) relative position information of the home appliance control device (also referred to as "Smart Energy Gateway (SEG)") and the solar panel can be managed in the server.

FIG. 214 is a diagram of switching of a mobile terminal screen when touching the solar panel. The mobile terminal obtains, from the solar panel, information such as an apparatus ID and a communication protocol or a product sever address of a manufacturer of the solar panel, and determines whether or not the solar panel is capable of communicating with the home appliance control device. The determination may be made by the server based on the information transmitted from the mobile terminal, or made by the mobile terminal. If the obtained communication protocol enables communication, then the mobile terminal performs setting for connection using the communication ID. On the other hand, if the obtained communication protocol does not enable communication, then the mobile terminal may download firmware from the server to update the firmware by proximity wireless communication, or may instruct the home appliance control device to update the firmware. In the case where the solar panel is an apparatus that cannot be set automatically by proximity wireless communication, after manually performing the setting, a setting completion signal is transmitted from the home appliance control device, so that the mobile terminal can confirm the setting completion. In the case where the solar panel is an apparatus that can be set by simultaneously pressing a setting button of a terminal and a button of the home appliance control device, the setting button of the mobile phone and the button of the home appliance control device are cooperated with each other via a secure path to perform the setting by the simultaneous button pressing. It is assumed that each of these setting methods is automatically downloaded to the mobile terminal according to the types of both the home appliance control device and the home appliance. This allows the user to instantly complete the setting automatically through the use of an optimum method.

FIG. 215 is a diagram of switching of a mobile terminal screen in subsequent authentication of the solar panel. The other solar panels can basically perform the authentication in the same manner as the solar panel No. 1. The secret key is re-issued for the other solar panels, so that the other solar panels can sequentially perform the authentication. In addition, registration of relative positions of the respective solar panels onto the server makes it possible to display, on a screen of the mobile terminal (remote controller) or TV via the server, video by which the user can see actions for the panels at once.

FIG. 216 is a diagram of a screen of the mobile terminal for displaying an energy state of the solar panel. By displaying energy production amounts and panel positions simultaneously or alternately, the user can be informed how much energy is produced by each panel.

FIG. 217 is a diagram of a screen of the mobile terminal for displaying a temperature state of the solar panel. Typically, the temperature state is abnormal in the case where a trouble occurs in the solar panel. This being so, combining the temperature state with panel position information allows the user to instantly recognize which panel has a trouble, so that the panel can be repaired promptly. In addition, if the trouble is notified to a repair shop via the server, it is possible to automatically request the repair.

FIGS. 218 to 222 are flowcharts in setting the solar panel. The user sets an apparatus connection mode of the mobile terminal (Step 5081). The mobile terminal displays "Please make the mobile terminal touch (be close to) the home appliance control device", and starts polling by proximity wireless communication. The user makes the mobile terminal touch the home appliance control device (a parent device or a solar panel controller) (Step 5082). Here, the mobile terminal repeats the polling until the touch (Step 5083). The repeating times out when a predetermined time period has passed without the touch. Furthermore, if the touched home appliance control device is at a sleep mode so that a part of circuits in the home appliance control device is not activated, the part of circuits is activated (Step 5084). The mobile terminal obtains an apparatus ID, a communication ID (MAC address, NFC-ID, or the like), an available communication protocol, a version of the communication protocol, and a sever address regarding the home appliance control device, by proximity wireless communication. The mobile terminal also connects to the server, enters a "setting connection to another apparatus" mode, and downloads a connection setting program corresponding to the home appliance control device from the server. In the case where the version of the communication protocol is old, the mobile terminal upgrades the communication protocol (Step 5085). Given that the setting mode is effective for a predetermined time period, the mobile terminal displays a message prompting for touch within the predetermined time period (Step 5086). The user brings the mobile terminal to a location of a target apparatus to be connected (Step 5087). Here, the mobile terminal measures a relative position of the mobile terminal with respect to the position of the home appliance control device in a 3D space, using the angular velocity sensor, the acceleration sensor, the geomagnetic sensor, and the GPS. The mobile terminal transmits the measured data to the server. The server uses the data to calculate a 3D movement locus and coordinates after movement of the mobile terminal, and measure a distance between the mobile terminal and the SEG (Step 5087*a*). In the case where the traveling time or the distance is short, the mobile terminal provides a secret key issued by the home appliance control device to the home appliance upon touch (Step 5088). In the case where the traveling time or the distance is long, however, the mobile terminal turns the setting mode OFF (Step 5089). Subsequently, when the mobile terminal reaches the position of the apparatus (Step 5090), the mobile terminal turns the setting mode ON again, and connects to the server to request re-issuance of a secret key to the home appliance control device. The mobile terminal communicates with the home appliance control device, and thereby records (a) the number of home appliances for which the mobile terminal has provided pieces of setting information to the home appliance control device, (b) the number of setting completions actually performed by the home appliance control device based on the pieces of setting information, and (c) numeral numbers assigned to the respective setting completions (Step 5092, Step 5093). Thereby, the home appliance control device can confirm whether or not unconformity occurs after authorization with the plurality of mobile terminals. Next, the user makes the antenna unit of the mobile terminal touch an antenna unit of the n-th apparatus (e.g. solar panel) (Step 5094). The mobile terminal reads, from the memory of the apparatus via NFC, NFC-ID, a MAC address, a manufacturer ID, standard, version, and protocol of the wireless communication, a manufacturer name, a product name, a model number, an error, and/or a history, and transmits the read information to the server (Step 5095). The mobile terminal or the server checks a protocol for enabling communication with the home appliance control device (Step 5096). In the case where the communication protocol of the apparatus is old (Step 5097), the mobile terminal downloads a new version of the communication protocol from the server and upgrades the communication protocol of the apparatus by proximity wireless communication (Step 5098). In the case where the communication protocol of the home appliance control device is different from the communication protocol of the apparatus (Step 5100), the mobile terminal transmits an instruction to download data of the communication protocol, to the home appliance control device. Alternatively, the mobile terminal downloads data of the communication protocol corresponding to the apparatus from the server. The mobile terminal then touches the home appliance control device and installs the new communication protocol enabling communication via NFC in the home appliance control device, or installs the new communication protocol in the home appliance control device via an internet such as a wireless LAN (Step 5101). If an error occurs in the process from download to installation, the process is repeated (Step 5102). The user inputs (presses) a switch (button) “start connection between home appliance control device and apparatus” of the mobile terminal (Step 5103). The home appliance control device, the mobile terminal, or the server issues a secret key (time-limited) (Step 5104). The mobile terminal transmits the network ID or the MAC address of the apparatus and the secret key to the home appliance control device, via an internet server or via an intranet such as a wireless LAN (Step 5105). The mobile terminal also transmits the network ID or the MAC address of the home appliance control device, the secret key, and a transmission instruction to the apparatus using NFC (Step 5106). The apparatus and the home appliance control device directly communicate with the mobile terminal by short-distance wireless communication (e.g. ZigBee) (Step 5110). The mobile terminal changes a radio strength of the short-distance wireless communication according to a distance L between the apparatus and the home appliance control device, in order to enhance security and save energy (Step 5111). Here, if the distance L or an obstacle in the communication is large, the mobile terminal presents the user with a screen display for recommending the user to perform communication with the SEG via a relay device that will be described later. The home appliance control device and the apparatus authenticate each other (Step 5112). The home appliance control device transmits the authentication result to the mobile terminal via the server (Step 5113). As an alternative, the mobile terminal is touched to the apparatus to transmit the authentication result from the apparatus to the mobile terminal. As another alternative, the authentication result is displayed on the apparatus by illumination or the like (Step 5115). In the case of an authentication failure, the process is repeated from key issuance (Step 5114, 5116). Once the authentication of all apparatuses is completed (Step 5118), the mobile terminal notifies the server of the completion, releases the connection mode, and ends the process (Step 5120). Otherwise, the mobile terminal is moved to the position of the next apparatus (Step 5119). When the mobile terminal performs the above-described setting for a plurality of apparatuses, the mobile terminal transmits physical relative or absolute 3D position information of the mobile terminal. The server maps arrangement relationships of the n-th and (n+1)-th apparatuses (panels in the solar panel, for example) in a 3D space (Step 5121). The server transmits, to the mobile terminal, the 2D or 3D image information or coordinate information which indicates pieces of 2D or 3D position information of the first to the (n+1)-th apparatuses, and the mobile terminal thereby displays the transmitted information on the screen of the mobile terminal (Step 5122).

FIG. 223 is a flowchart of processing of equipping the solar panel according to this embodiment. In receiving sunshine, solar panels produce DC high power, causing dangerous arc discharge. Therefore, prior to setting of a solar panel, it is preferable that a light-blocking sheet 5202 is attached in order to prevent power production. Furthermore, until communication setting has been completed, it is preferable to keep the light-blocking sheet to be attached for safety. However, in the situation where a target panel of the solar panel is covered with the light-blocking sheet, it is difficult to know where the communication IC is on the target panel. Therefore, a mark indicating an antenna unit of proximity wireless communication is printed on a part of the light-blocking sheet which is located on the same position of the antenna unit. In performing communication setting for the target panel, the mobile terminal touches the mark on the light-blocking sheet. After completing the communication setting, the light-blocking sheet is removed. Therefore, the communication setting is performed by touching, while ensuring safety.

Here, the communication IC 5203*e* includes a wireless IC such as ZigBee and a communication IC 5203*f* such as NFC. The communication IC 5203*e* is shielded and is not connected to the outside except a power supply line 5203*a*. Therefore, the communication IC 5203*e* has a long life of about thirty years, satisfying long life requirement. Furthermore, the controller 5203*c* receives instructions from the server 5203*d*, and therefore the controller 5203*c* causes a power supply unit 5203*b* to supply power to the communication IC 5203*e*, for several tens of seconds, several times per hour, in order to intermittently apply a voltage. As a result, a duty cycle of about 1/100 is achieved. This retards deterioration of semiconductor IC, so that long life can be ensured in comparison to the method by which a voltage is constantly applied.

The following describes the case where the manufacturers or protocols of the SEG and the apparatus are different, with reference to FIG. 224.

First, in Step 5201*a*, the mobile terminal is set to a reading mode. In Step 5201*b*, the mobile terminal is touched to the SEG (controller). In Step 5201*c*, the mobile terminal reads data of the SEG such as a manufacturer name, an apparatus ID, a product number, and a sever address.

Next, in Step 5201*d*, the mobile terminal determines whether or not the sever address is obtained from the SEG. In the case where the determination in Step 5201*d* results in Yes, the process proceeds to Step 5201*e* in which the mobile terminal accesses the server address. In Step 5201*f*, the mobile terminal performs connection. The process then proceeds to Step 5201*i* (FIG. 225).

In the case where the determination in Step 5021*d* or 5201*f* results in No, the process proceeds to Step 5201*g* in which the mobile terminal accesses the sever address of the manufacturer or the product number of the SEG. In Step 5201*h*, the user selects the manufacturer or the product number of the SEG on a menu screen. The process then proceeds to Step 5201*i* (FIG. 225).

The following describes SEG software upgrade means, with reference to FIG. 225.

First, in Step 5201*i*, the mobile terminal displays an initial menu. In Step 5201*j*, the user selects a menu for connecting the SEG to a new apparatus.

Next, in Step 5201*k*, the mobile terminal determines whether or not there is a new version of software or firmware of the SEG. In the case where the determination in Step 5201*k* results in Yes, the process proceeds to Step 5201*m* in which the mobile terminal or the SEG starts downloading the new version of software from the server. In Step 5201*n*, the user selects an "Install" button of the mobile terminal. In Step 5201*p*, the SEG is upgraded after authentication between the SEG, the server, and the mobile terminal. The process then proceeds to Step 5201*q* (FIG. 226).

In the case where the determination in Step 5201*k* results in No or in the case where the user does not select the "Install" button of the mobile terminal in Step 5201*n*, the process proceeds to Step 5202*q* (FIG. 227).

The following describes FIG. 226.

First, in Step 5201*q*, in the case where the SEG is connected to the server (Yes), the process proceeds to Step 5201*t* in which the SEG, the mobile terminal, and the server perform authentication. In the case of "OK" in Step 5201*u*, the process proceeds to Step 5202*a* in which the SEG installs the new version of software from the server. In the case where the installation is completed in Step 5202*b*, the process proceeds to Step 5202*g* (FIG. 227). In the case where the installation is not completed in Step 5202*b*, the process returns to Step 5201*t*.

In the case where the determination in Step 5201*q* results in No, the process proceeds to Step 5201*r* in which the mobile terminal downloads the new version of software from the server. In the case where the download is completed (Yes) in Step 5201*s*, the process proceeds to Step 5202*c*. In the case where the download is not completed (No) in Step 5201*s*, the process returns to Step 5201*r*.

In Step 5202*c*, the mobile terminal displays "Please touch mobile terminal to SEG for m seconds". In Step 5202*d*, the user touches the mobile terminal to the antenna unit of the SEG.

In the case where the determination in Step 5202*d* results in Yes, i.e. in the case where the mobile terminal is successfully touched to the antenna unit of the SEG, the process proceeds to Step 5202*e* in which the mobile terminal transmits the new version of software directly to the SEG by NFC or the like to install the new version of software. In the case where the installation is completed in Step 5202*f*, the process proceeds to Step 5202*g* (FIG. 227).

In the case where the determination in Step 5202*d* results in No or in the case where the installation is not completed (No) in Step 5202, the process returns to Step 5202*c*.

The following describes flow in the case where the version of software of the SEG is latest and the SEG holds information of a connected apparatus beforehand, with reference to FIG. 227.

In Step 5202*g*, the mobile terminal determines whether or not the SEG (controller) is connected to the server.

In the case where the determination in Step 5202*g* results in Yes, the process proceeds to Step 5202*h* in which the mobile terminal is connected to the SEG via the server. The process then proceeds to Step 5202*j*. In the case where the determination in Step 5202*g* results in No, the process proceeds to Step 5202*i* in which the mobile terminal is connected to the SEG via a wireless intranet such as ZigBee or a wireless LAN. The process then proceeds to Step 5202*j*.

In Step 5202*j*, the mobile terminal is set to "apparatus connection mode" on a menu screen or the like, and "What is manufacturer name of connected apparatus?" is displayed.

Next, in the case where a manufacturer name, a model number, or a product serial number of the connected apparatus (e.g. air conditioner, washing machine, TV, recorder) is known (Yes), the process proceeds to Step 5202*m* in which the user selects or inputs the manufacturer name, the product name, or the model number on the screen of the mobile terminal and the mobile terminal transmits the data to the server. In Step 5202*n*, the server examines protocol information such as a communication standard, middleware, and an application of the apparatus, based on the apparatus information.

Next, in Step 5202*p*, the server determines whether or not normal communication is possible using the communication protocol of the SEG and the communication protocol of the connected apparatus. In the case where the determination in Step 5202*p* results in Yes, the process proceeds to Step 5203*e* (FIG. 229).

In the case where the determination in Step 5202*k* results in No, the process equally proceeds to Step 5203*e* (FIG. 229). In the case where the determination in Step 5202*p* results in No, the process proceeds to Step 5202*q* (FIG. 228).

The following describes FIG. 228.

First, in Step 5202*q*, the server searches for a new version of communication protocol (physical layer, middleware, application layer) and transmits the new version of communication protocol to the mobile terminal or the SEG. In Step 5202*r*, the mobile terminal displays "Do you wish to download new version of communication protocol?" In the case where the OK button is pressed (Yes) in Step 5202*s*, the process proceeds to Step 5202*u*. In the case where the OK button is not pressed (No) in Step 5202*s*, the process proceeds to Step 5202*t* in which the mobile terminal displays "Connection and communication with this apparatus is not possible."

Next, in Step 5202*u*, the mobile terminal determines whether or not the SEG is connected to the server and data of the communication protocol is large. In the case where the determination in Step 5202*u* results in Yes, the process proceeds to Step 5203*a* in which method 1 is employed. That is, the mobile terminal transmits an installation instruction, a cryptographic communication key, and authentication data directly to the SEG, and the SEG downloads the communication protocol for the connected apparatus from the server within a predetermined time period set by the server, thus starting communication. In the case where the communication is successful in Step 5203*b*, the process proceeds to Step 5203*e* (FIG. 229). In the case where the communication is not successful in Step 5203*b*, the process returns to Step 5202*r*.

In the case where the determination in Step 5202*u* results in No, the process proceeds to Step 5203*c* in which method 2 is employed. That is, the mobile terminal downloads the communication protocol and, after mutual authentication between the SEG, the server, and the mobile terminal, shares the encryption key and transmits the communication protocol directly to the SEG by NFC or the like, to install the communication protocol in the SEG. In the case where the installation is successful in Step 5203*d*, the process proceeds to Step 5203*e* (FIG. 229). In the case where the installation is not successful in Step 5203*d*, the process returns to Step 5202*u*.

The following describes FIG. 229.

First, in Step 5203*e*, the mobile terminal determines whether or not the operator (user) selects a "setting connection to new apparatus" mode of the mobile terminal.

In the case where the determination in Step 5203*e* results in Yes, the process proceeds to Step 5203*f* in which the mobile terminal and the SEG establish cryptographic communication via a home network other than NFC, such as the Internet or a wireless LAN, through touch. In Step 5203*g*, the mobile terminal displays "Please move to position of apparatus within n minutes." In Step 5203*h*, the operator (mobile terminal) starts moving. The process then proceeds to Step 5203*i* (FIG. 230).

In the case where the determination in Step 5203*e* results in No, Step 5203*e* is performed again.

The following describes 3D mapping with reference to FIG. 230.

In Step 5203*i*, the mobile terminal measures a 3D change of the position of the mobile terminal with respect to the position of the SEG, using the angle sensor, the geomagnetic sensor, and the acceleration sensor. The mobile terminal then obtains relative 3D coordinate information of the SEG and the mobile terminal.

Next, in Step 5203*j*, the mobile terminal determines whether or not the apparatus (air conditioner on the first floor, air conditioner on the second floor, microwave, washing machine, TV, or recorder on the first floor) is reached. In the case where the determination in Step 5203*j* results in Yes, the process proceeds to Step 5203*k*. In the case where the determination in Step 5203*j* results in No, the process returns to Step 5203*i*.

In Step 5203*k*, the operator determines whether or not the apparatus includes the first wireless communication unit (e.g. NFC). In the case where the determination in Step 5203*k* results in Yes, the process proceeds to Step 5203*n* in which the operator touches the mobile terminal to the first antenna unit of the apparatus. In Step 5203*p*, the mobile terminal reads a MAC address and a network ID of the apparatus and transmits them to the server. In Step 5203*g*, the mobile terminal transmits 3D coordinate information of the position of the apparatus to the server.

Next, in Step 5203*r*, the mobile terminal determines whether or not the apparatus and the SEG have the same communication protocol. In the case where the determination in Step 5203*r* results in Yes, the process proceeds to Step 5203*s*. In the case where the determination in Step 5203*r* results in No, the process proceeds to Step 5203*z* in which a change routine for the communication protocol of the SEG is performed. The process then proceeds to Step 5203*s*.

Next, in Step 5203, the operator presses a connection start button of the SEG and the apparatus. In the case where the determination in Step 5203 is Yes, i.e. in the case where the connection start button of the SEG and the apparatus is pressed, the process proceeds to Step 5203*t*. In the case where the determination in Step 5203*s* is No, Step 5203*s* is performed again.

Next, in Step 5203*t*, the mobile terminal or the server issues a secret key (time-limited), and transmits the secret key together with a transmission instruction to the apparatus using NFC. The same data is equally transmitted to the SEG. In Step 5203*u*, the SEG and the apparatus directly communicate with each other for authentication. In Step 5203*x*, the authentication is completed. In the case where the authentication is not completed in Step 5203*x*, the process returns to Step 5203*n*.

In the case where the determination in Step 5203*k* results in No (no NFC), the process proceeds to Step 5203*l* in which a manufacturer name, a product name, a product model number, and a product serial number of the apparatus are read by a bar-code reader of the mobile terminal or visually and the read data are input to the mobile terminal. In Step 5203*n*, the mobile terminal transmits the data to the server. The process then proceeds to Step 5204*a* (FIG. 231).

The following describes FIG. 231.

First, in Step 5204*a*, the server examines protocol information such as a communication standard, middleware, and an application of the apparatus and the SEG, based on the apparatus information. In Step 5204*b*, the server determines whether or not normal communication is possible using the communication protocol of the SEG and the communication protocol of the apparatus to be connected (connected apparatus).

In the case where the determination in Step 5204*b* results in Yes, the process proceeds to Step 5203*c* (FIG. 228). In the case where the determination in Step 5204*b* results in No, the process proceeds to Step 5204*c* in which the server searches for a version of communication protocol (physical layer, middleware, application layer) of the SEG suitable for communication with the apparatus. In Step 5204*d*, the mobile terminal displays "Do you wish to download communication protocol suitable for apparatus?". In Step 5204*e*, the mobile terminal determines whether or not the OK button is pressed. In the case where the determination in Step 5204*e* results in Yes (OK button is pressed), the process proceeds to Step 5204*g* (FIG. 232). In the case where the determination in Step 5204*e* results in No, the process proceeds to step 5204*f* in which the mobile terminal displays "Communication with this apparatus is not possible".

The following describes FIG. 232.

In Step 5204*g*, the mobile terminal determines whether or not the SEG is connected to the server. In the case where the determination in Step 5204*g* results in Yes, the process proceeds to Step 5204*h* in which the mobile terminal determines whether or not the mobile terminal and the SEG are capable of cryptographic communication via the Internet or a wireless home network (other than NFC). The process then proceeds to Step 5204*i* in which the mobile terminal transmits an installation instruction, a cryptographic communication key, and authentication data to the SEG via the Internet or an intranet such as a wireless LAN within a predetermined time, to download the communication protocol for the connected apparatus from the server to the SEG. In the case where the download is successful in Step 5204*j*, the process proceeds to Step 5204*k* in which the apparatus and the SEG perform wireless communication other than NFC using the optimum communication protocol, to start an authentication procedure. In this case, the distance and obstacle between the SEG and the apparatus are calculated based on 3D coordinates of the SEG and the apparatus and 3D structure data of the building, and optimum minimum signal output is set according to the calculation result. In Step 5204*m*, the mobile terminal displays "Connection can be started" and "Please press OK button and connection start button of apparatus within m seconds". The process then proceeds to Step 5204*n* (FIG. 233).

In the case where the determination in Step 5204*g* or 5204*h* results in No, the process proceeds to Step 5205*a* (FIG. 233) in which the mobile terminal displays "Please move to SEG and touch mobile terminal to SEG". In Step 5205*b*, the operator moves and touches the SEG. The process then proceeds to Step 5203*c* (FIG. 228).

The following describes FIG. 233.

First, in Step 5204*n*, the operator presses the OK button of the mobile terminal. In Step 5204*p*, the SEG issues a secret key according to an instruction from the mobile terminal, and continues cryptographic communication for a predetermined time period. In Step 5204*q*, the operator presses the connection start button of the apparatus. In Step 5204*r*, the apparatus issues a secret key (time-limited) and continues cryptographic communication for a predetermined time period. In Step 5204*s*, the SEG and the apparatus perform mutual authentication.

In the case where the authentication is successful in Step 5204*t*, the process proceeds to Step 5204*u* in which "Connection between SEG and apparatus is completed" is displayed on the screen of the mobile terminal or the apparatus is caused to perform a specific operation such as display. The process then ends in Step 5204*y*.

In the case where the authentication is not successful (No) in Step 5204*t*, the process proceeds to Step 5204*x* in which "Connection failure" is displayed.

The following describes FIG. 234.

In Step 5206*a*, the mobile terminal determines whether or not it is determined that direct communication is difficult in the case where the distance or obstacle between the apparatus and the SEG is large based on the 3D coordinate information of the SEG and the 3D coordinate information of the apparatus to be connected by the server (controller) when the mobile terminal or the like is connected to the server.

In the case where the determination in Step 5206*a* results in Yes, the process proceeds to Step 5206*b* in which the server searches for a PAN coordinator as a relay device between the apparatus and the SEG based on 3D coordinate information of relay devices and notifies the position information of the relay device to the mobile terminal. In Step 5206*c*, when necessary, the mobile terminal is touched to the apparatus again, to obtain the MAC address, the network ID (e.g. PAN ID), the communication protocol, the communication key, and the 3D coordinates of the apparatus. In Step 5206*d*, the mobile terminal determines whether or not the mobile terminal has network configuration information such as the MAC address and the network ID (e.g. PAN ID) of the SEG.

In the case where the determination in Step 5206*d* results in Yes, the process proceeds to Step 5206*f* (FIG. 235). In the case where the determination in Step 5206*d* results in No, the process proceeds to Step 5206*e* in which the operator moves to and touches the mobile terminal to the SEG to obtain the MAC address, the IP address, the network ID, the communication protocol, the communication key (and the 3D coordinates again). The server optimizes the configuration of the whole network (MAC address of each child device, network ID (PAN ID) of sub-network) using 3D coordinate information of each apparatus, AEG, and relay device, and registers the configuration information in the SEG. The process then proceeds to Step 5206*f* (FIG. 235).

The following describes FIG. 235.

First, in Step 5206*f*, the operator moves to and touches the mobile terminal to the relay device (e.g. ZigBee), to obtain the position information of the relay device again. The mobile terminal also calculates, from the 3D coordinate information of the apparatus, the relay device, and the SEG and the 3D coordinates of the building in the server or the like, optimum network configuration information, i.e. a relay connection method or a topology of an optimum relay device as a relay point between sub-networks (PAN IDs), and records the configuration information from the server or the mobile terminal via NFC or the SEG. The mobile terminal transmits a recording instruction to the relay device via at least NFC. In this case, setting is made so that the apparatus is connected to the SEG via the relay device. In detail, the mobile terminal registers the MAC address, the network ID, and the communication key of the apparatus (or apparatuses) in the relay device.

Next, in Step 5206*g*, the mobile terminal determines whether or not the connection between the apparatus and the relay device is completed. In the case where the connection is completed (Yes), the process proceeds to Step 5206*h*. In the case where the connection is not completed (No), the process returns to Step 5206*f*.

In Step 5206*h*, the mobile terminal records, in the relay device, connection information of the relay destination such as the MAC address, the network ID, the communication key, and the protocol of the mobile terminal, the server, or the SEG via NFC or a network. Thereby, the relay device (PAN coordinator) starts connecting (a) a sub network having PAN ID to which the apparatus having the registered MAC address belongs to (b) the SEG having a MAC address belonging to a sub network having PAN ID to which the SEG belongs.

Next, in Step 5206*i*, the mobile terminal determines whether or not the connection between the relay device and the SEG is completed. In the case where the determination in Step 5206*i* results in Yes, the process proceeds to Step 5206*j* in which the mobile terminal determines whether or not the relay connection authentication between the apparatus and the SEG is completed. In the case where the determination in Step 5206*j* results in Yes, the relay between the apparatus, the relay device, and the SEG is completed in Step 5206*k*. In the case where the determination in Step 5206*i* results in No or in the case where the determination in Step 5206*j* results in No, the process returns to Step 5206*h*.

As described above with reference to FIGS. 234 and 235, the use of 3D mapping according to this embodiment allows the mobile terminal to obtain 3D position information of a child device, a parent device, and a relay device which are connected via ZigBee or wireless LAN. This is because the mobile terminal always holds the 3D coordinate information. When the mobile terminal is close to each of the child device, the parent device, and the relay device via NFC, or when the mobile terminal, which is close to each of the devices/apparatuses, receives information from the device, the mobile terminal exchange physical position relationships among the devices/apparatuses with the devices/apparatuses. As a result, the mobile terminal can obtain the 3D position information as well as the network ID information such as a MAC address from each of the devices/apparatuses. By processing the obtained data by the mobile terminal or by a server in or outside the user's home, a physically optimum network configuration can be attained. This network configuration information can be easily calculated when the 3D position relationships are known. In detail, it is possible to easily determine that the configuration where (a) a sub network PAN ID1 includes an apparatus having a MAC address 1, another apparatus, and a relay device having a MAC address 3, (b) a sub network PAN ID2 includes the SEG having a MAC address 2 with Internet protocols, and other apparatuses having MAC addresses 5 and 6, respectively, all of which are connected by radio, and (c) the PAN ID1 and the PAN ID2 are connected to each other via the relay device can offer maximum energy saving, stability, and loop prevention, as shown in an example in the lower part of FIG. 234.

Here, the conventional methods such as ZigBee require a one-to-one relationship between the SEG and the child device. This is because addition of a relay device requires optimization of designing and setting of the whole network configuration, and there has been no method for easily obtaining 3D position relationships of respective devices/apparatuses. Such conventional methods are possible in networks used in company offices that can afford cost and effort. However, general home cannot afford such cost and effort for home appliances such as air conditioners, a microwave, and a solar panel. Therefore, the addition of relay device in a home network has not been easy.

However, in the present invention, it is possible to obtain position information and ID information such as MAC addresses of the apparatuses (home appliances), only by making the mobile terminal touch the apparatuses by using NFC or by inputting data into the mobile terminal positioned very close to the apparatuses. Therefore, the server or the mobile terminal can obtain the configuration information without cost and effort. If the mobile terminal is operated to record the obtained configuration information directly or indirectly onto the SEG or the relay device, it is possible to easily generate optimum network configuration information. Furthermore, the use of NFC allows the user to check unauthorized actions by using a cryptography key or 3D position information, thereby increasing security. Therefore, the addition of relay device is possible also at home, and it is possible to achieve stable wireless communication over a long distance between a solar panel on the roof and a SEG on the first floor, or a long distance between a SEG at home and a heat pump system or a charging system outside home, for example. Then, in these cases, the use of the server makes it possible to calculate the network configuration information at high accuracy by using 3D coordinates. Therefore, it is possible to configure an ideal network system, and prevent abnormal communication such as loop. As a result, transmission efficiency can be increased.

[Embodiment 21]

In Embodiment 21, the description is given for a system that enables the mobile terminal to serve as a remote controller for operating an apparatus by using a 3D product map of a building with reference to the drawings.

FIG. 189 shows an example of apparatus control by a mobile device 102 which uses the 3D product map of the building according to this embodiment. In addition to the building data, FIG. 190 shows an example of the apparatus control in the case where it is possible to recognize a room where each apparatus exists, according to this embodiment. The apparatus control processing performed by the mobile terminal shown in FIGS. 189 and 190 is described with reference to FIGS. 236, 237, and 238.

First, in S6001, the mobile terminal obtains position information of the mobile terminal using GPS information.

Next, in S6002, the mobile terminal obtains position information that is to be used as a reference point. For example, in the case where an unlocking system, which locks/unlocks keys by the mobile terminal via proximity wireless communication, is cooperated with an entrance key of the building, the mobile terminal obtains an apparatus ID of the unlocking system via proximity communication when the entrance key is unlocked by the proximity communication of the mobile terminal. Then, the mobile terminal sets, as the reference point, position information associated with the obtained apparatus ID (position "1" in FIG. 290). Here, the database in which the apparatus ID and the position information are stored in association with each other may be held in the server or the mobile terminal. It should be noted that the mobile terminal may obtain the position information of the entrance key directly from the entrance key by using proximity communication, or of course, from another apparatus except the unlocking system.

In S6003, the user holding the mobile terminal enters the building. Here, the mobile terminal may detect the user's entrance based on output information of a sensor provided to a door, and set a position of the door to be the reference point.

The following describes the situation where the user walks from position "1" to position "2" in FIG. 190, in S6004. In S6004, the mobile terminal obtains information of a step length of the user walking at home from a database, and detects the number of steps n in a target section by using an acceleration sensor, a geomagnetic sensor, or a vibrating gyro. Multiplying the step length by the number of steps n results in the traveling distance. In addition, the mobile terminal detects the traveling direction by using the vibrating gyro and the geomagnetic sensor. Based on the calculated traveling distance and traveling direction, the mobile terminal calculates a relative position of the mobile terminal with respect to the reference point in the 3D space, and records the calculated position information onto a database in the mobile terminal. The mobile terminal may transmit the position information and the traveling information of the mobile terminal, to the server.

The following describes the situation where the user is at position "2" in FIG. 190, in S6005. In S6005, when the user moves to in front of the TV on the first floor and points the mobile terminal to the TV, if the TV is on a normal line passing 3D coordinate information of the position of the mobile terminal in a direction measured by the mobile terminal, the mobile terminal is connected to the TV via a network and the TV becomes remotely controllable by the mobile terminal.

The following describes the situation where the user moves from position "3" to position "4" in FIG. 190, in S6006. In S6006, when the user moves on the first floor, enters a Japanese-style room, and points the mobile terminal to the air conditioner, the mobile terminal is connected to the air conditioner on a network so that the mobile terminal can serve as a remote controller of the air conditioner. Here, in the same manner as in S6004, the mobile terminal detects a traveling distance from position "3" to position "4" based on the step length and the number of steps of the user, and thereby calculates 3D position information (relative position information) of the mobile terminal. The 3D position information is stored into the database in the mobile terminal or the server.

Furthermore, in S6007 in FIG. 237, when the user moves from position "4" to position "5" in FIG. 190, a traveling distance is calculated based on the number of steps, and then stored into the database in the mobile terminal or the server. As described above, such traveling information for each traveling section is accumulated in the database for each user. Therefore, the accumulation is used as a walking history of each user depending on each traveling section. A step length of each user is learned from the walking history to increase its accuracy.

In S6008, when the user reaches a staircase in the home, the mobile terminal starts calculating (a) a traveling change in the height and (b) a horizontal traveling distance, regarding user's traveling on the staircase. Here, it is assumed that m represents a height of one stair and that k represents a length of one stair. Under the assumption, multiplying the number of steps by m results in the traveling change in the height, and multiplying the number of steps by k results in the horizontal traveling distance. It is noted that m and k are accumulated in the database, so that m and k are learned from the past data to increase their accuracy.

The following describes the case where the user ascends by a lift and not by the staircase, in S6009. In this case, characteristic data of the lift in the building is recorded on the database. A time r required to ascend from a floor P to a floor Q is obtained from the database, and the floor number to which the user ascends is measured based on the required time r. It is also possible to increase the accuracy of P, Q, and r by learning them from past data. In addition, start and stop of the ascending lift is detected by the acceleration sensor.

If it is determined in S6010 that the ascending has been completed, then the processing proceeds to S6011.

In S6011, a horizontal traveling distance of the ascending is calculated by multiplying the step length by the number of steps, and a traveling direction of the ascending is detected by the vibrating gyro. Based on the horizontal traveling distance and the traveling direction, the mobile terminal generates 3D position information of the mobile terminal. If there is 3D structure data of the building, the position information is modified based on the 3D structure data to increase its accuracy. In S6012 which follows, it is assumed that the user moves out from the lift or the staircase and temporarily stops at the front-left of a TV on the second floor (at position "5" in FIG. 190).

In S6013, it is determined whether or not an accumulated error E in the accumulated pieces of 3D position information is greater than a predetermined error allowable value. The accumulated error E is calculated by multiplying a traveling distance by 5%. If it is determined that the accumulated error E is greater than the error allowable value, then the processing proceeds to S6014.

In S6014, the mobile terminal searches apparatuses having (relative or absolute) position information registered in the database, for an apparatus having position information closest to the position information of the mobile terminal. The mobile terminal then presents the searched-out apparatus on the screen of the mobile terminal. The operator takes a photograph of the apparatus by a camera unit of the mobile terminal. The mobile terminal recognizes the apparatus based on the image photographed by the camera unit, and calculates a relative angle and a distance between the mobile terminal and the apparatus in order to modify a reference position.

Subsequently, in S6015 in FIG. 238, the mobile terminal obtains network information (MAC address, IP address, communication key, and the like) of the apparatus based on apparatus ID of the apparatus, and is thereby connected to the apparatus. When the user presses a Lock button on the mobile terminal while pointing the mobile terminal to the apparatus, the connection between the mobile terminal and the apparatus is fixed. As a result, the mobile terminal can serve as a remote controller of the apparatus or display video data of the apparatus on the screen of the mobile terminal.

Finally, in S6016, the mobile terminal completes the remote control operation function.

By the above-described processing, the mobile terminal can obtain a relative position of the mobile terminal with respect to a reference point, and can thereby serve as a remote controller of an apparatus only by pointing the mobile terminal to the apparatus without using correct absolute position information.

Furthermore, if an error in the traveling distance measured by the acceleration sensor is large, it is possible to decrease the error of the position information by using a step length, position information of the apparatus, and the like.

FIG. 239 is a flowchart showing processing of determining a correct reference point of the mobile terminal when a current reference point of the mobile terminal is not correct, according to this embodiment of the present invention.

First, in the case of determining that the reference point of the mobile terminal cannot be obtained yet in S6020, the process proceeds to S6021. In S6021, the mobile terminal captures the image of the apparatus. The captured image may be transmitted to the server.

Next, in S6022 and S6023, the mobile terminal recognizes the type of the apparatus from the captured image. In S6024 and S6025 which follow, an image showing only the apparatus is filtered, and the resulting image is transmitted to the server.

Next, in S6026, the server determines a rough position of the mobile terminal by a base station, GPS, or the like, and thereby specifies a building in which the mobile terminal currently exists. The server specifies the captured apparatus from the apparatus list associated with the building. It should be noted that if the current position of the mobile terminal is not known, the captured apparatus is specified from an apparatus list associated with the user of the mobile terminal. The server also obtains a size and 3D shape information of the apparatus, and stores these information into the database.

Next, in S6027, a relative angle between the mobile terminal and the apparatus is calculated based on an angle at which the apparatus is pointed in the image. Moreover, in S6028, a zoom magnification or the like is obtained from optical characteristic information of the mobile terminal, and a distance between the mobile terminal and the apparatus is calculated.

In S6029, position information Pr indicated by 3D relative coordinate information of the mobile terminal and the apparatus can be obtained based on the distance and relative angle between the mobile terminal and the apparatus.

In S6030, 3D coordinate information Pd of the relative or absolute position of the apparatus is read from the memory in the server or the mobile terminal, and the relative or absolute position Pm of the mobile terminal in the building is calculated based on the position information Pr and the coordinate information Pd.

Eventually, in S6031, the position Pm is set to be position information of the reference point of the mobile terminal.

By the above-described processing, even if a reference point of the mobile terminal has not yet been set, for example, if it is immediately after powering the mobile terminal ON, it is possible to determine the reference point by using a photographed image. In addition, the filtering of the apparatus image from the photographed image allows the user to transmit the apparatus image to the server without considering privacy of home information.

FIGS. 240 and 241 are flowcharts of processing for connecting an apparatus to a parent device in a network to which the apparatus belongs.

First, in S6111, the user points the mobile terminal to an apparatus to be connected.

Next, in S6112, the mobile terminal recognizes the apparatus by processing an image of the apparatus captured by the camera of the mobile terminal based on position information (e.g. 3D coordinate information) of the mobile terminal. Having recognized the apparatus, the mobile terminal obtains a type, a model number, and rough position information (e.g. 3D coordinates) of the apparatus. The mobile terminal obtains information of candidate apparatuses which are registered apparatuses having position information close to position information obtained using the database of the mobile terminal or the server, and performs image matching between the captured apparatus and the candidate apparatuses, to check whether or not the recognized apparatus is a registered apparatus.

In the case of determining that the apparatus to be connected is already registered in the database in the server or the mobile terminal in S6113, the process proceeds to S6114.

In S6114, the mobile terminal obtains an apparatus ID, a connection protocol, a communication key, and a server address from the database in the server or the mobile terminal, and connects to the apparatus via a network. In S6115 which follows, the mobile terminal issues various commands based on position information of the mobile terminal and the apparatus and a direction of the mobile terminal.

In the case of determining that the apparatus to be connected is not registered in the database in the server or the mobile terminal in S6113, the process proceeds to S6116.

In S6116, the mobile terminal determines whether or not the apparatus has a network function and whether or not the mobile terminal can recognize a model number of the apparatus. In the case of determining that the apparatus does not have the network function and the mobile terminal cannot recognize the model number of the apparatus in S6116, the process proceeds to S6117.

In S6117, the user opens the cover of the apparatus to expose 2D bar-code held by the apparatus, and captures an image with the camera of the mobile terminal.

In S6118 which follows, the mobile terminal reads the 2D bar-code, decrypts encrypted data of the 2D bar-code, and reads an apparatus ID, a connection communication protocol, a communication standard, a remote control function (infrared remote control, wireless ZigBee, etc.), a net address (MAC address, IP address, communication key), a server address, and the like. The mobile terminal records the read data in the database in the server or the mobile terminal.

Next, in S6119, the mobile terminal obtains 3D shape information of the apparatus from the server, calculates 3D position information of the apparatus from the captured image and 3D position information of the mobile terminal at image capturing, and records the 3D position information in the database.

In the case of determining that the apparatus has the network function and the mobile terminal can recognize the model number of the apparatus in S6116, the process proceeds to S6120.

In S6120, the mobile terminal determines whether or not the apparatus has an AOSS function.

In the case of determining that the apparatus has the AOSS function in S6120, the process proceeds to S6121.

In S6121, determination of whether or not the mobile terminal can communicate with the parent device is made.

In the case of determining that the mobile terminal can communicate with the parent device in S6121, the process proceeds to S6122.

In S6122, determination of whether or not the apparatus has an infrared communication receiving function or a wireless remote control (e.g. ZigBee) receiving function is made.

In the case of determining that the apparatus does not have the infrared communication receiving function or the wireless remote control (e.g. ZigBee) receiving function in S6122, the process proceeds to S6123. In S6123, when the user presses a connection start button on the mobile terminal, the mobile terminal transmits an AOSS instruction to the parent device of the apparatus to cause the parent device to switch to a registerable mode. At the same time, when the user presses an AOSS button on the apparatus, the apparatus starts connection authentication with the parent device and continues the connection authentication for a certain time period. In this case, radio output is controlled to minimum necessary based on the distance and obstacle between the parent device and the apparatus using the 3D position information of the parent device and the 3D position information of the apparatus, to enhance communication security.

In S6124 which follows, determination of whether or not the connection authentication is successful is made. In the case of determining that the connection authentication is successful, the process proceeds to S6126.

In the case of determining that the apparatus has the infrared communication receiving function or the wireless remote control (e.g. ZigBee) receiving function in S6122, the process proceeds to S6125.

In S6125, when the user presses the connection start button on the mobile terminal, the mobile terminal transmits the communication key and an AOSS start instruction to the parent device having the same communication protocol as the apparatus. At the same time, the mobile terminal transmits the communication key and an AOSS instruction to the apparatus using a remote control transmission function, to cause the apparatus and the parent device to start mutual authentication.

In S6126 which follows, the mobile terminal determines whether or not the mutual authentication is completed. In the case of determining that the mutual authentication is not completed in S6126, the process returns to S6125. In the case of determining that the mutual authentication is completed in S6126, the process proceeds to S6127 in which the mobile terminal determines whether or not the parent device and the apparatus are connected.

In the case of determining that the parent device and the apparatus are connected in S6127, the process proceeds to S6128.

In S6128, an apparatus ID, a product number, an address, an error code, a use time period, history, and 3D position information are transmitted to the server via the parent device.

In S6129 which follows, the mobile terminal obtains 3D shape information of the apparatus from the database based on the product number of the apparatus, and calculates 3D position information of the apparatus based on the distance and the 3D direction from the mobile terminal which are detected from the captured image and the position information of the mobile terminal at image capturing. The mobile terminal records the calculated 3D position information into the database in the server or the mobile terminal.

By the above-described processing, even if the apparatus is not provided with a proximity communication function, the use of a 2D bar-code enables easy connection between the apparatus and the parent device. As a result, it is possible to register the apparatus onto the server, or register the 3D position information of the apparatus onto the server.

The following describes a flowchart shown in FIG. 242.

First, in Step 6140*a*, 3D coordinate mapping is performed.

Next, in Step 6140*b*, the user moves the mobile terminal to a location of a metes-and-bounds position. In Step 6140*c*, the mobile terminal transmits GPS information of the mobile terminal to the server, and obtains 3D absolute coordinate information including a metes-and-bounds boundary mark or a measurement reference point ID of a location close to the mobile terminal. The mobile terminal has two kinds of 3D coordinate information which are 3D coordinates of a relative position and 3D coordinates of an absolute position, and stores the obtained 3D absolute coordinate information into an absolute position 3D coordinate database.

Next, in Step 6140*d*, the mobile terminal switches a GPS sensor to a motion sensor to determine a position. The mobile terminal obtains a distance using the number of steps and a step length and a direction using a vibrating gyro, and calculates 3D coordinate information.

Next, in Step 6140*e*, the user touches the mobile terminal to an NFC unit of a key of the building to unlock the key, and also records current 3D coordinate information into the database in the mobile terminal or the server or into the NFC unit of the key.

Next, in Step 6140*f*, the mobile terminal calculates 3D coordinate information based on the number of steps, the step length, and the direction when the user enters the building.

The mobile terminal switches to direction information detected by a vibrating gyro, if the accuracy of a three-axis magnetic sensor deteriorates due to noise or the like. The process then proceeds to Step 61040*g* (FIG. 243).

The following describes flowcharts shown in FIGS. 243 and 244.

First, in Step 6140*g*, if a traveling distance from a reference point to a current position is short, the position accuracy is high. Accordingly, when the user touches an antenna unit of an NFC unit of an apparatus having registered 3D position information, the mobile terminal updates 3D position information of the apparatus, and records a high-accuracy position information identifier indicating that the 3D position information has high accuracy, into the NFC unit or the database in the server or the mobile terminal together with the 3D coordinate information.

Next, in Step 6140*h*, the mobile terminal determines whether or not "(3D coordinate accumulated error PE)>(predetermined value)".

In the case where the determination in Step 6140*h* results in Yes, the process proceeds to Step 6140*i*. In Step 6140*i*, the mobile terminal searches apparatuses having NFC functions in the home such as a TV, an air conditioner, a microwave, and a refrigerator for an apparatus assigned with the high-accuracy position identifier and close to the mobile terminal, and displays the apparatus (e.g. TV) on the screen of the mobile terminal together with an instruction "Please touch antenna unit of NFC unit of apparatus". The process then proceeds to Step 6140*j* (FIG. 244).

In the case where the determination in Step 6140*h* results in No, the process proceeds to step 6140*n* (FIG. 244). In Step 6140*n*, the mobile terminal can detect an action of the user by the acceleration sensor, when the user walks up the first stair of a staircase, when the user finishes walking up the final stair of the staircase, when the user stops in front of a closed door, when the user starts ascending by a lift, when the user stops the ascending in the lift, when the user stops in front of a closed entrance door, when the user walks up a step of the entrance, when the user starts ascending by a ladder, when the user turns at a corner of a corridor, or when the user goes around a bulged wall of the house. The mobile terminal performs matching of the current 3D coordinate information of the mobile terminal to the 3D coordinate information of the building to update 3D reference coordinates, which contributes to enhanced accuracy. The mobile terminal records the high-accuracy position identifier into the database.

Next, in Step 6140*j*, the mobile terminal determines whether or not the user touches the mobile terminal to the antenna unit of the apparatus. In the case where the determination in Step 6140*j* results in Yes, the process proceeds to Step 6140*k*.

Next, in Step 6140*k*, the mobile terminal determines whether or not the 3D coordinates of the apparatus are significantly different from the 3D coordinates of the mobile terminal. In the case where the determination in Step 6140*k* results in Yes, the process proceeds to Step 6140*p*. In Step 6140*p*, the mobile terminal determines that the apparatus has moved from the original position indicated by the previously-measured coordinates, and records an error information identifier into the database in the apparatus. In Step 6140*q* which follows, if there is an apparatus assigned with the high-accuracy position identifier near the mobile terminal, the user touches the mobile terminal to the apparatus to update the 3D coordinate information, and also touches the mobile terminal to the apparatus determined as having moved from the original position to record the correct position information into the database and assign the high-accuracy position identifier.

In the case where the determination in Step 6140*j* results in No, the process proceeds to Step 6140*n*.

In the case where the determination in step 6140*k* results in No, the process proceeds to Step 6140*m* in which the mobile terminal updates the 3D coordinate information of the position of the mobile terminal as the 2D or 3D coordinate information of the apparatus, to correct the 3D coordinate information of the position of the mobile terminal. The process then proceeds to Step 6140*n*.

[Embodiment 22]

FIG. 245 is a diagram showing an apparatus (device) structure according to Embodiment 22 of the present invention.

In FIG. 245, mobile device display screens 9001, 9002, and 9003 all represent display screens of the same mobile device 9000. The mobile device display screen 9001 is presented when the user holding the mobile device 9000 points the mobile device 9000 to a TV 9004. Likewise, the mobile device display screens 9002 and 9003 are presented when the user holding the mobile device 9000 points the mobile device 9000 to a recorder 9005 and a microwave 9006, respectively.

FIG. 246 is a diagram showing (a) display screens of the mobile device 9000 and (b) display screens of a TV as an example of the cooperation apparatuses, according to this embodiment of the present invention.

FIGS. 247 to 251 are flowcharts of processing according to this embodiment of the present invention.

Embodiment 22 is described with reference to FIG. 247 first.

First, the mobile device 9000 obtains position information of the mobile device (S9302). The method of obtaining the position information of the mobile device has already been described in detail with reference to FIG. 236, so that the description will not be repeated below.

Next, the user points the mobile device 9000 to an apparatus (the TV 9004, in this example) (S9303).

Here, the mobile device 9000 extracts, from the database, apparatus candidates in the direction pointed by the mobile device 9000, based on 3D (relative or absolute) coordinate information of positions of the mobile device 9000 and the TV 9004, direction information indicating the direction pointed by the mobile device 9000, attitude information of the apparatus, and area information of the apparatus (S9304).

In the case where there are a plurality of apparatus candidates in the direction pointed by the mobile device 9000 (Yes in S9305), the mobile device 9000 displays a list of the apparatus candidates with their position relationships on the screen of the mobile device 9000 (S9306). After this, when the user changes the direction pointed by the mobile device 9000 (Yes in S9307), the mobile device 9000 changes the display of the apparatus candidates on the screen of the mobile device 9000 according to the changed direction, based on determination as to how much each of the apparatus candidates is close to the center of the direction pointed by the mobile device 9000 (S9308). Here, when the apparatus candidates are displayed on the display screen of the mobile device 9000, an apparatus candidate closer to the center of the direction pointed by the mobile device 9000 is displayed closer to the center of the display screen. It is also possible that the apparatus candidate closer to the center of the direction pointed by the mobile device 9000 is displayed higher in the display screen, or displayed with a target cursor.

When an apparatus that the user desires to operate is displayed at the center of the display, the user presses the Lock button (S9309). The Lock button may be a physical switch of the mobile device 9000, or may be a virtual button displayed on a touch panel of the mobile device 9000. Or, the Lock button may be a different device logically connected to the mobile device 9000. The above step is shown in 9222 in FIG. 246.

In the case where the determination in S9309 is Yes, the mobile device 9000 specifies the specific apparatus (a TV or a microwave, for example) pointed by the mobile device 9000, and obtains or downloads, from the database in the server or the mobile device 9000, network connection information (a MAC address, an IP address, a communication key, a communication standard, a communication protocol) of the specified apparatus, a performance capability of the specified apparatus, a program for the specified apparatus, a script for the apparatus, and the like (S9310). The mobile device 9000 holds a flag (Lock flag). When the Lock button is pressed, the Lock flag indicates that the mobile device 9000 is connected to the target apparatus pointed by the mobile device 9000. While the Lock flag is ON, the Step S9304 is not performed even if the user changes the direction of the mobile device 9000. Therefore, even if the user changes the direction of the mobile terminal 9000 while the mobile device 9000 is connected to the target apparatus such as the TV 9004, the mobile terminal 9000 is not disconnected from the target apparatus. As a result, it is possible to prevent that the display of the apparatus selected by the user is disappeared.

The following describes a direction pointed by the user using the mobile device 9000 to a certain apparatus (a TV, a recorder, a microwave, or the like) with reference to FIG. 255.

In this embodiment, a target apparatus to be operated by the mobile device 9000 is specified by using (a) 3D (relative or absolute) coordinate information of positions of the mobile device 9000 held by the user and the target apparatus (a TV, a recorder, a microwave, or the like), and (b) a direction of the mobile device. If the mobile device is in almost cuboid shape, a direction of the mobile device which is used to specify the target apparatus is assumed to be in parallel to a longer side of a virtual cuboid forming a case of the mobile device. It is assumed that the mobile device has the buttons and the display screen as shown in FIG. 255, and that the user generally holds the mobile device by the display screen side not the buttons side. Under the assumption, the direction of the mobile device pointing the target apparatus is a direction 9111 from the buttons side to the display screen side. If the mobile device is a Smartphone, such as iPhone 4 manufactured by Apple Inc., which hardly has buttons, and therefore the user holds the mobile device by hand in various ways, it is possible that a gravity point of the user's hand on the mobile device is detected by a gravity sensor, a gyro sensor, a camera unit, a proximity sensor, and the like of the mobile device, and a direction resulting in the longest distance from the gravity point to the outer periphery of the mobile device is set to be the direction from the mobile device.

It should be noted that, if the mobile device 9000 has a rear-side camera unit 9113 on the rear side of the display screen, a parallel direction 9111 in parallel to the direction of the rear-side camera unit may be set to be a direction from the mobile device 9000. The direction 9111 may be used as the direction from the mobile device when the camera unit is not operated, while the direction 9112 may be used as the direction from the mobile device when the camera unit is operated. When the camera unit is operated and the direction 9112 is therefore set to be the direction from the mobile device, the user can press the Lock button to specify the target apparatus, while watching the target apparatus displayed on the display screen of the mobile device 9000. Here, the target apparatus is specified based on the 3D coordinate information of positions of the mobile device and the target apparatus and the direction information of the mobile device.

It is also possible to dynamically change a direction of the mobile device, according to a shape of the mobile device, an activation state of the gravity sensor, the gyro sensor, a camcorder unit, a user proximity sensor, an activation state of the camera unit, user's selection of a direction pointed by the mobile device, a line of sight of the user, a posture of the user, or the like.

Therefore, the user can select the target apparatus merely by pointing the mobile device intuitively to a certain apparatus, without being conscious of how the user holds the mobile device.

Moreover, it is also possible that the mobile device may be pointed in a plurality of directions at the same time to specify a target apparatus. It is therefore possible to search a wide range for the target apparatus regardless of how the user holds the mobile device.

Embodiment 22 is further described below, with reference to the flowcharts in FIGS. 247 and 248.

Next, the mobile device 9000 attempts to be connected with the apparatus via a network, by using the network connection information obtained in S9301 (S9401). If the connection is successful (Yes in S9401) and only communication information is obtained from the database (Yes in S9402), then the mobile device 9000 inquires the apparatus or the server for a performance capability of the apparatus, obtains a control display program to be executed in the mobile device 9000 (S9403), and executes the control display program (S9404).

In the case where the apparatus is a TV, the mobile device 9000 obtains, from the apparatus, the number of TV programs, titles, thumbnails, and the like of channel broadcast programs of the TV, and displays them on the display screen of the mobile device 9000 (S9405). The above step is shown in 9223 in FIG. 246.

In the case where the user selects (presses a button, clicks on a touch panel, performs pinch out gesture, for example) a thumbnail of a certain program on the screen of the mobile device 9000 (Yes in S9406), the mobile device 9000 issues an instruction to display the selected TV program to the apparatus (TV) (S9407). The above step is shown in 9224 in FIG. 246.

The TV displays the designated TV program, and transmits video data having quality corresponding to the performance capability of the mobile device 9000 to the mobile device 9000 (S9408).

The mobile device 9000 receives the video data transmitted from the TV, and displays the video data (S9409). The above step is shown in 9224 in FIG. 246.

When the user flicks to the right on the display screen of the mobile device 9000, Steps S9407 to S9409 are performed for a next channel TV program, and the next channel TV program is displayed on both the display screen of the mobile device 9000 and the screen of the TV 9004 (S9410). The above steps are shown in 9225 in FIG. 246.

With the above structure, the user can intuitively control a function of the target apparatus to be operated, merely by pointing the mobile device to the apparatus.

Furthermore, the use of attitude and shape information of the apparatus makes it possible to specify the apparatus pointed by the mobile device, even if a distance from the center of the apparatus such as a large-screen TV and an edge of the mobile device is long. As a result, it is possible to correctly specify the apparatus which the user intends to point.

Embodiment 22 is further described below, with reference to the flowcharts in FIGS. 249 and 250.

In a state where a specific TV program is displayed on the mobile device 9000 (S9501), the user points the mobile device 9000 to a target apparatus (a recorder, a TV, or the like) in which the user wishes to store or display the TV program, while pressing a Move button on the mobile device 9000 (Yes in S9502).

Here, the mobile device 9000 extracts, from the database, apparatus candidates in the direction pointed by the mobile device 9000, based on 3D (relative or absolute) coordinate information of positions of the mobile device 9000 and the apparatus candidates, direction information indicating the direction pointed by the mobile device 9000, attitude information of each of the apparatus candidates, and area information of each of the apparatus candidates (S9503).

In the case where there are a plurality of apparatus candidates in the direction pointed by the mobile device 9000 (Yes in S9504), the mobile device 9000 displays a list of the apparatus candidates with their position relationships on the screen of the mobile device 9000 (S9505). After this, when the user changes the direction pointed by the mobile device 9000 (Yes in S9506), the mobile device 9000 changes the display of the apparatus candidates on the screen of the mobile device 9000 according to the changed direction, based on determination as to how much each of the apparatus candidates is close to the center of the direction pointed by the mobile device 9000 (S9507). Here, when the apparatus candidates are displayed on the display screen of the mobile device 9000, an apparatus candidate closer to the center of the direction pointed by the mobile device 9000 is displayed closer to the center of the display screen. It is also possible that the apparatus candidate closer to the center of the direction pointed by the mobile device 9000 is displayed higher in the display screen, or displayed with a target cursor.

When an apparatus that the user desires to operate is displayed at the center of the display, the user releases the Move button (S9508). The Move button may be a physical switch of the mobile device 9000, or may be a virtual button displayed on a touch panel of the mobile device 9000. Or, the Move button may be a different device logically connected to the mobile device 9000.

When the specific apparatus (e.g. recorder, TV, microwave) pointed by the mobile device 9000 is specified, the mobile device 9000 obtains or downloads, from the database in the server or the mobile device 9000, network connection information (a MAC address, an IP address, a communication key, a communication standard, a communication protocol) of the apparatus, a performance capability of the apparatus, a program for controlling the apparatus, a script for the apparatus, and the like (S9510).

In the case where the specified apparatus has a recording capability (Yes in S9601), the mobile device 9000 transmits, to the specified apparatus, content source information (a channel number, a content address, a content URI, and the like), a recording range (time, unit, or the like), a content sever address, a source range, authentication information (authentication protocol, a key), and the like together with a recording instruction (S9602).

Upon receiving the recording request from the mobile device 9000, the apparatus performs connection, receives the recording data, and records the data according to the request.

The apparatus transmits information of the recorded content, such as a title, details, a still picture thumbnail, a video thumbnail, and the like, to the mobile device 9000 (S9604).

The mobile device 9000 displays the details of the content recorded by the apparatus, on the mobile device 9000. The mobile device 9000 also displays a dialog for the user, in order to determine whether or not the recording by the apparatus is to be continued (S9605). In the case where the user approves the recording (Yes in S9606), the apparatus continues the recording. In the case where the user does not approve the recording (No in S9606), the apparatus stops the recording (S9607).

Next, when the mobile device 9000 is disconnected from the recording apparatus (the recorder, for example), the mobile device 9000 displays information of the previously displayed apparatus (the TV, for example) again (S9609).

With the above structure, when the user wants to record a TV program which he or she is watching, the user can record the program without the need to replace the currently-held device with a recorder remote controller and input program information of the TV program with the recorder remote controller. It has been described in this embodiment that the target apparatus to be operated by the mobile device is a recorder and that the user records a TV program currently watched on a TV onto the recorder. However, this embodiment is not limited to the above example. The apparatus may be a display apparatus. In this case, the user may display the currently watching TV program or content on the target apparatus, instead of recording the TV program or content onto the target apparatus. As a result, the user can watch a currently-watched TV program, Web page, or content also on a different display apparatus, without necessity of inputting information of the TV program, Web page, or content by using a keyboard of a remote controller of the different display apparatus. Furthermore, a Web page which the user is watching on the mobile device can be displayed also on the display apparatus.

Embodiment 22 is further described below, with reference to the flowchart in FIG. 251.

After S9609, it is assumed that, on the mobile device 9000, the user is watching the same video as that displayed on the TV (S9701).

When the user wishes to use the mobile device 9000 as a remote controller of the apparatus, the user presses the remote control mode button displayed on the display screen of the mobile device 9000 (Yes in S9702). As a result, the screen of the mobile device 9000 switches to the remote control mode for the apparatus (S9703). Here, the program for controlling the target apparatus (TV) which has been obtained at S9510 includes a remote control mode button display function and a remote control mode control program (or script).

With the above structure, by pointing the mobile device to the TV to be controlled, the user can display a remote control mode for the TV on the mobile device and control channels and a sound volume of the TV, without using a remote controller of the TV. Moreover, there is no need to download a TV remote control application and select a program corresponding to the TV unlike a conventional mobile phone, as a program for the TV to which the remote controller is pointed is automatically downloaded. This simplifies the operation of switching to the remote control mode.

Next, in the case where a use frequency or a communication rate between the remote controller and the apparatus is low (Yes in S9704), the remote controller obtains ZigBee or infrared communication protocol from the server, to switch to a wireless communication standard of lower power consumption.

With the above structure, automatic selection of a communication standard optimal to a corresponding function can reduce power consumption of the mobile device and the peripheral apparatus.

Next, in the case where the user presses a Lock Release button displayed on the screen of the mobile device 9000 (Yes in S9706), the mobile device 9000 releases connection from the apparatus (TV or the like) (S9707), and returns to the initial screen (S9708). The above step is shown in 9228 in FIG. 246.

With the above structure, when the user wishes to cause the mobile device to execute functions of different apparatuses, it is possible to selectively switch the functions.

Embodiment 22 is further described below, with reference to the flowcharts in FIGS. 253 and 254.

First, the mobile device 9000 obtains position information of the mobile device (S9912). The method of obtaining the position information of the mobile device has already been described in detail with reference to FIG. 236, so that the description will not be repeated below.

Next, the user displays a cooking recipe using a Web browser or the like on the mobile device 9000 (S9901).

In the situation where the specific recipe is displayed on the mobile device 9000, the user points the mobile device 9000 to an apparatus (a microwave, a cooking machine, or the like) which the user intends to use for cooking, while pressing the Move button on the mobile device 9000 (Yes in S9902). This step is shown in "C" in FIG. 245.

Here, the mobile device 9000 extracts, from the database, apparatus candidates in the direction pointed by the mobile device 9000, based on 3D (relative or absolute) coordinate information of positions of the mobile device 9000 and the apparatus, direction information indicating the direction pointed by the mobile device 9000, attitude information of the apparatus, and area information of the apparatus (S9903).

In the case where there are a plurality of apparatus candidates in the direction pointed by the mobile device 9000 (Yes in S9904), the mobile device 9000 displays a list of the apparatus candidates with their position relationships on the screen of the mobile device 9000 (S9905). When the user changes the direction pointed by the mobile device 9000 (Yes in S9906), the mobile device 9000 changes the display of the apparatus candidates on the screen of the mobile device 9000 according to the changed direction, based on determination as to how much each of the apparatus candidates is closer to the center of the direction pointed by the mobile device 9000 (S9907). Here, regarding the apparatus candidate display on the display screen of the mobile device 9000, an apparatus candidate closer to the center of the direction pointed by the mobile device 9000 is displayed closer to the center of the display. It is also possible that the apparatus candidate closer to the center of the direction pointed by the mobile device 9000 is displayed higher in the display, or displayed with a target cursor.

When the apparatus that the user desires to operate is displayed at the center of the display, the user releases the Move button (S9908). The Move button may be a physical switch of the mobile device 9000, or may be a virtual button displayed on a touch panel of the mobile device 9000. Or, the Move button may be a different device logically connected to the mobile device 9000.

When the specific apparatus (microwave in this example) pointed by the mobile device 9000 is specified, the mobile device 9000 obtains or downloads, from the database in the server or the mobile device 9000, network connection information (a MAC address, an IP address, a communication key, a communication standard, a communication protocol) of the apparatus, a performance capability of the apparatus, a program for controlling the apparatus, a script for the apparatus, and the like (S9910).

In the case where the specified apparatus has a cooking capability (Yes in S9001), the mobile device 9000 transmits, to the specified apparatus, recipe information (cooking details and method (ranging, oven-frying, mixing, kneading, baking, swearing, thawing, heating, and steaming, etc.), cooking extent (temperature, time, etc.)) or recipe source information (URL, etc.), authentication information (authentication protocol, key), and the like together with a recording instruction (S9002).

Upon receiving the recording request from the mobile device 9000, the apparatus performs connection, receives the recording data, and records the data according to the request (S9003).

The apparatus transmits the recorded cocking data such as cooking recipe details to the mobile device 9000 (S9004).

The mobile device 9000 displays, on the mobile device 9000, the cooking details of the apparatus. The mobile device 9000 also displays a dialog for the user in order to determine whether or not to continue the cooking (S9005). In the case where the user approves the cooking (Yes in S9006), the apparatus continues the cooking.

Next, when the mobile device 9000 is disconnected from the cooking apparatus (e.g. microwave), the mobile device 9000 displays information of the previously-displayed apparatus (e.g. TV) again (S9009).

In the above-described manner, when the user wishes to cook by using a cooking recipe displayed on the mobile device 9000, the user can perform the cooking without inputting the cooking recipe into a microwave or a cooking machine. Furthermore, even if the recipe is not stored in the microwave or the cooking machine, the recipe can be recorded onto the apparatus without any complicated procedures. In addition, the cooking appliance does not need to have a device such as a browser or a touch panel. As a result, a cost of the cooking appliance can be reduced.

S9502 in FIG. 249 is described in detail below, with reference to the steps from 9227 in FIG. 246.

If the user unlock (releases) the Lock button (Yes in 9227*a*), the mobile device returns to the previously-displayed screen (here, the screen displaying the TV).

If the user does not release the Lock button (No in 9227*a*) and wishes to record the displayed information onto the recorder (Yes in 9227*b*), the user points the mobile device in a direction from "A" to "B" in FIG. 245 while pressing the Move button (9227*c*).

The mobile device detects an apparatus existing in the pointed 3D direction from 3D coordinate information by using a 3D direction sensor in the mobile device, and is connected to the apparatus (recorder) (9227*d*). Here, the display shown in 9227*e* is displayed.

If the user releases the Move button in the state of 9227*e* (9227*f*), the mobile device transmits a request for recording a currently-displayed TV program, to the apparatus (recorder). The display shown in 9227*g* is displayed on the screen of the mobile device, and the recorder starts recording of the TV program displayed on the mobile device.

Furthermore, if the user changes the direction pointed by the mobile device from direction "B" to direction "A" in FIG. 245 (9227*h*), the display shown in 9227*i* is displayed on the mobile device.

The following describes effects of this embodiment with reference to FIG. 245. In FIG. 245, solid lines show directions of "A", "B", and "C", respectively, from the mobile terminal to the respective apparatuses, in the case where the display screen 9001 is pointed to the front sides of the TV, the recorder, and the microwave, respectively. Dotted lines show directions of the mobile terminal, in the case where the display screen 9001 is pointed to the rear sides of the TV, the recorder, and the microwave, respectively. In a conventional method merely using a motion sensor, which is applied to games and the like, when the display screen 9001 is pointed to the front side of the TV, the direction "A" is rotated to the left (in other words, in counterclockwise direction) to be switched to the direction "B". Therefore, the target apparatus is switched from the TV to the recorder as the operator intends. However, when the display screen 9001 is pointed to the rear side of the TV, the direction "A" is rotated in clockwise direction, which is opposite to the counterclockwise direction, to be switched to the direction "B" to point to the recorder. Therefore, the motion sensor wrongly detects that the target apparatus pointed by the mobile terminal is switched from the TV to the microwave. As a result, the mobile terminal wrongly selects the microwave and displays it on the display screen. Therefore, the mobile terminal performs false operation which the operator does not intend.

In this embodiment, however, 3D mapping coordinate information of the TV, the recorder, and the microwave are registered by using NFC and the server beforehand. The mobile terminal also stores 3D coordinate information of the mobile terminal itself. Therefore, when the mobile terminal is moved to the rear side of the TV located at the center of a large room and then rotated in clockwise direction from the direction "A" shown by the dotted arrow to the TV to the direction "B" shown by the dotted arrow to the recorder, the mobile terminal can correctly select the recorder to be displayed, based on the 3D coordinate information of the positions of the TV, the recorder, and the mobile terminal and the direction pointed by the mobile terminal. As a result, the screen of the mobile terminal displays the recorder. Furthermore, the mobile terminal is linked to the recorder. As described above, this embodiment can offer special advantages of preventing false operations.

Generally, there are few dozens of home appliances at home. In this embodiment, when NFC communication is performed by touching such a home appliance by the mobile terminal, a distance between the mobile terminal and the home appliance is about 5 cm to 10 cm. If the mobile terminal has correct position information, the position information with accuracy of about 5 cm to 10 cm is sent to the server. In other words, in this embodiment, the few dozens of home appliances at home are set to be reference points for position determination. Conventionally, there has been a problem that there is no reference point that is a reference in position determination so that a position in a building cannot be determined correctly. This embodiment, however, can offer significant advantages that most of home appliances can serve as reference points.

(Position Information Obtainment Method in Communication Method Having Plural Transmission Paths)

As shown in FIG. 256, there is a communication method, such as Multiple Input Multiple Output (MIMO), which uses a plurality of antennas to establish a plurality of transmission paths to transmit data. The following describes a method of obtaining position information in the case where a parent device 9306 and a mobile terminal (mobile device) 9308 communicate with each other by the above-mentioned communication method. The parent device 9306 communicates with the mobile terminal 9308 via three transmission paths 9308*a*, 9308*b*, and 9308*c*. In practice, there are nine transmission paths (3×3 transmission paths), though not shown in the drawing. In this case, the mobile terminal 9308 using the communication method such as MIMO calculates a transfer function A according to the illustrated expression in Step 9307*g*. The mobile terminal 9308 further calculates transmission information such as eigenvectors X and Wi, an eigenvalue λ, and the like, and performs communication. Here, the nine transmission paths have respective different characteristics, such as different eigenvectors, phases, and amplitudes.

More specifically, in Step 9307*a*, characteristics of the respective transmission paths are extracted. In Step 9307*b*, a radio field strength is measured. In Step 9307*c*, transmission characteristics of the respective transmission paths are determined based on the 3D coordinate information of the mobile terminal 9308 stored in the mobile terminal itself and the direction information of the mobile terminal 9308. In Step 9307*f*, transfer functions 9307*d* of the respective transmission paths corresponding to the coordinate information and the radio field strength 9307*e* as well as the 3D coordinate information and the direction information are transmitted to a server 9302.

In Step 9350 in FIG. 257, the server 9302 generates a pattern of (a) the 3D coordinate information of the mobile terminal 9406 determined at a specific time, (b) the direction of the mobile terminal 9406, (c) transmission characteristics (transfer function, eigenvalue, eigenvector of the transmission path), and (d) the strength. As shown in Step 9351*a*, the generated pattern is compressed with the transmission patterns 9352*a*, 9352*b*, 9352*c* (in more detail, AAA, ADA, CAB, for example) corresponding to the respective pieces of 3D coordinate information 1, 2, and 3, thereby mapping the patterns into a 3D coordinate space. In Step 9353*a*, the resulting transmission patterns (pieces of transmission information) are recorded onto a database in the server 9302 in which 3D coordinate positions are stored. Here, it is also possible to record characteristics of a change in the transmission information for a predetermined time period during which the mobile terminal is moved.

As described above, the pieces of transmission information are recorded onto the database in the server. Here, such transmission information (transmission pattern) of the mobile terminal 9308 is recorded in association with each user. Though the mobile terminal transmits position information with a low accuracy to the server, pieces of input transmission information (transmission patterns) are learned to record position information with a higher accuracy on the database.

Next, in Step 9353*b*, it is assumed that the mobile terminal transmits current transmission information to the server in order to obtain current position information. In Step 9353*c*, the server matches (a) the transmission pattern transmitted from the mobile terminal with (b) each of the transmission patterns (pieces of transmission information) recorded on the database in the server. For example, "AAA" is searched for by using a pattern matching method. In the case where there is any transmission pattern candidate in the database which is similar to the transmission pattern transmitted from the mobile terminal and the radio field strength of the mobile terminal (Step 9353*d*) and also the number of such candidates is one (Step 9353*e*), the server transmits, to the mobile terminal, 3D coordinate position information of the transmission pattern candidate in the database.

On the other hand, if there is not only one candidate, the process proceeds to Step 9353*h*. Consider the case where there are three transmission patterns of AAA, which are patterns 9355*a*, 9355*b*, and 9355*c* as shown in FIG. 257. In Step 9353*h*, based on low-accuracy 3D coordinate information 9357 stored in the mobile terminal, the plurality of candidates are narrowed down (filtered) to only candidates close to the mobile terminal. As a result, the number of candidates can be reduced. If the number of candidates is not one, the server instructs the mobile terminal to use the low-accuracy 3D coordinate information stored in the mobile terminal in Step 9353*f*. On the other hand, if the number of candidates is one (Step 9353*i*), the server 9302 transmits 3D coordinate information of the transmission pattern to the mobile terminal (Step 9353*j*).

However, the mobile terminal 9308 in a room cannot obtain GPS position information from satellites. Therefore, a position of the mobile terminal 9308 in a room is determined by using the three-axis vibrating gyro, the acceleration sensor, and the geomagnetic sensor. However, as the mobile terminal 9308 is far from a reference point, more errors are accumulated to decrease an accuracy.

However, in the case of the method according to this embodiment, such as MIMO, which uses a plurality of transmission paths, the number of patterns such as transfer functions is increased. Therefore, there are more transmission patterns in a room in comparison with the situation using one transmission path. Each of the patterns is changed with a move of $\lambda/2$. In other words, if a pattern from which characteristics of a transmission path are extracted is known, it is possible to determine a position with a high accuracy of $\lambda/2$. For example, in the case of 1 GHz, it is possible to determine a position with an accuracy of 15 cm. The method has a problem that there would be a plurality of identical transmission patterns in the same room. In this embodiment, however, the mobile terminal 9308 includes the position detection unit so that false patterns can be eliminated from pieces of low-accuracy position information. Thereby, the mobile terminal 9308 can obtain high-accuracy position information.

Moreover, MIMO can change directions of beams emitted from a plurality of antennas. If a beam direction from the mobile terminal to the parent device is changed, it is possible to change a level of received signals such as a strength of a transmission path of a receiver, for example. Move of the mobile terminal 9308 changes the state of the transmission path. Therefore, if the 3D coordinate position of the parent device is known, the position of the mobile terminal 9308 can be calculated.

As described above, according to this embodiment, a mobile device (communication device), such as a mobile telephone or a Smartphone, can easily serve as an extended user interface, such as a multiple remote controller or a home appliance content download interface, of a target apparatus, by using a RF-ID unit of the mobile device and various sensors such as a GPS and a motion sensor.

[Embodiment 23]

The following describes Embodiment 23 of the present invention.

FIG. 258 is a diagram showing an example of (a) a floor of a general home such as a user's home and (a) apparatuses related to processing performed when a user holding a mobile device moves on the floor. In the user's home, it is assumed that home appliances such as TVs (a TV-A and a TV-B) are placed in different rooms. The location of the user is determined by a technology of determining a coordinate value of a position in the home. Such a coordinate value is stored in the mobile device. A coordinate value of each of the TVs is registered. Therefore, if the user wishes to control one TV (the TV-A) in a bedroom, the user can perform the control by pointing the mobile device to the TV and transmitting a command necessary for controlling the TV. In FIG. 258, the map information of the home, which is used by the mobile device to determine positions, may be held in the mobile device, in a home server such as the SEG (401*c*), or in a server connected to the mobile device via the Internet. The home server is connected to the mobile device via a public network of the mobile device or via a wireless LAN access point (401*e*). It is preferable that, as long as the map information is stored in the home server, the home server can provide the map information to the mobile device even if the Internet line is not connected. What is more, the map information can be managed without consuming the storage area of the mobile device more than necessary.

The following describes a flow of processing by which a user, who holds the mobile device 401*a* and is first near a building (user's home or the like) before entering the building, starts determining a position of the mobile device in the building by using a sensor in the mobile device.

With reference to FIG. 259, the processing of determining a position of the mobile device in the building is described. At the beginning, in Step 402*a*, the mobile device determines whether or not a GPS sensor or a function of detecting radio waves in the building in the mobile device is running. If the GPS sensor or the function is running (Yes), then the processing proceeds to Step 402*c*. In Step 402*c*, the mobile device determines whether or not coordinate information of a current position of the mobile device which are detected by the GPS sensor are close to the target building (user's home, for example) that has been registered, or whether or not the mobile device detects waves emitted from an apparatus in the target building which is to be connected via wireless LAN. Thereby, the mobile device detects whether or not the mobile device is close to the target building. If it is detected that the mobile device is close to the target building (home) (Yes in Step 402*c*), then the processing proceeds to Step 402*d*. If the determination in Step 402*c* is No, then the processing is repeated until the determination in Step 402*c* becomes Yes. On the other hand, if the determination in Step 402*a* is No, then the processing proceeds to Step 402*b*. In Step 402*b*, the user at the entrance of the building (user's home) selects an "indoor position determination mode" on a user interface of the mobile device in order to start position determination in the building. Then, the processing proceeds to Step 402*d*. In Step 402*d*, if the angular velocity sensor, the geomagnetic sensor, and the acceleration sensor of the mobile device are not running, then the mobile device activates these sensors and the processing proceeds to Step 402*e*. In Step 402*e*, it is determined whether or not a map and reference point information can be obtained from a map management server on a Cloud system or from a SEG (server in the user's home). If the determination in Step 402*e* is Yes, then the processing proceeds to Step 402*f*. In Step 402*f*, the mobile device obtains the map and the reference point information.

If the mobile device has an enough storage, the mobile device holds the map and the reference point information. How to store and obtain the map and the reference point information is not limited. It is also possible that the map and the reference point information are stored in the SEG or the server on the Cloud system, and the mobile device inquires the SEG or the server on the Cloud system about the map and the reference point information based on detection results of the sensor in the mobile device, so that the mobile device performs, via a network, the same processing as that in the case where the mobile device holds the map and the reference point information.

It is further possible that the mobile device obtains a limited part of the map and a limited part of the reference point information, regarding only a location close to a position of the mobile device. Thus, these information may be partially incorporated in the mobile device and put to use.

If the determination in Step 402*e* is No, then the processing proceeds to Step 402*g*. In Step 402*g*, the mobile device detects a predetermined characteristic change pattern (a move of a sliding door indicated by repetition of a previously-measured angle change, or a move on stairs indicated by a vertical acceleration change, for example). If such a pattern is detected in Step 402*g* (Yes), then the processing proceeds to Step 402*h*. In Step 402*h*, it is determined whether or not a "similar characteristic change pattern" similar to the detected pattern is registered in the mobile device. If the determination in Step 402*h* is Yes, then the processing proceeds to Circle 1 in FIG. 260. If the determination in Step 402*g* is No, then the detection routine is repeated until the determination in Step 402*g* becomes Yes.

Here, the characteristic change pattern in Step 402*g* is, for example, a change G in a vertical direction of an acceleration in a Z-axis (vertical) direction which indicates that the user holding the mobile device ascends three steps of stairs within three seconds. The detection of the change indicates that the user holding the mobile device reaches a height of a floor of the entrance. Then, within five seconds, for example, the angular velocity sensor detects that a Yew direction is changed by 90 degrees, which indicates that the user faces the entrance.

In this case, it is recognized that opening of a door is a user's usual action. As a result, it is determined that the mobile device is currently close to a reference point near the entrance door. In the situation, if the user is almost still for five seconds, for example, it is determined that the user is unlocking a key of the entrance. If the server or the mobile device holds coordinate information of the position in front of the entrance, position information of the mobile device is updated to the coordinate information. Then, the absolute coordinate system indicated by latitude/longitude of GPS information is switched to the relative coordinate system in the building. The switch to the relative coordinate system can eliminate conversion to coordinates to latitude/longitude, and also reduce conversion errors.

Consider the situation where the entrance door has a RF-ID (NFC) lock. Regarding the RF-ID according to this embodiment, coordinate information and a coordinate accuracy evaluation point Vs are recorded on the lock or the server. When the mobile device touches the lock, a distance between the mobile device and an antenna unit of the lock is within 5 cm. Therefore, if a coordinate accuracy evaluation point Vm of coordinate information of a position of the mobile device is greater than the coordinate accuracy evaluation point Vs, coordinate information of the lock is replaced by the coordinate information of the mobile device. On the other hand, if the coordinate accuracy evaluation point Vm of the mobile device is smaller than the coordinate accuracy evaluation point Vs, the above replacement is not performed. According to this embodiment, coordinate information and a coordinate accuracy evaluation point of the coordinate information are recorded on a RF-ID unit of an apparatus such as an air conditioner or a TV or on a server corresponding to the apparatus, so that, every time the mobile device touches the apparatus, higher-accuracy coordinate information and a higher-accuracy evaluation point are updated. As a result, the accuracy of position coordinate information of each apparatus is increased for every touching.

FIG. 260 is a flowchart of processing of determining a position of the mobile device in the building. In Step 403*a*, the mobile device specifies a target reference point (the entrance, for example) based on the data change pattern, and then obtains a coordinate value (a relative coordinate value with respect to an arbitrary reference point as an initial position, an absolute coordinate value based on latitude/longitude and sea level, or the like) of the reference point. In Step 403*b*, the mobile device assumes that a current position of the mobile device is the reference point, and writes the coordinate value of the reference point over the current position information stored in the mobile device. In Step 403*c*, by using the angular velocity sensor, the geomagnetic sensor, and the acceleration sensor, the mobile device starts measuring move of the mobile device from the reference point. In Step 403*d*, the mobile device determines a current position (current coordinate information) of the mobile device on a 3D space based on the information (move information) of the move from the reference point, and registers the 3D coordinate information of the current position. The Step 403*d* is repeated during move. In Step 403*e*, the mobile device determines based on the move information whether or not the mobile device moves without obvious ascending action using stairs or a lift on the map. In Step 403*f*, the mobile device determines whether or not the current coordinate information is higher height information. The height information is a height of the user holding the mobile device, which is obtained from the mobile device or from the server (the SEG, the server on a Cloud system, or the like). If the height information cannot be obtained, an average height (170 cm, for example) in the corresponding country or region is obtained from preset information in the SEG, the server, or the mobile device. If the current coordinate information is higher than the height, the coordinate information is modified to be lower than the height and then the processing proceeds to Circle 2 in FIG. 261.

Here, in Step 403*c*, the use of the angular velocity sensor, the geomagnetic sensor, and the acceleration sensor enables the mobile device to measure a move amount of the user to determine a 3D position of the user. It is also possible to use a sound sensor, an atmospheric pressure sensor, and the like to detect a location or a floor number where sound occurs. As a result, an accuracy of the position determination can be further increased.

According to this embodiment, it is possible to prevent the situation where the sensors in the mobile device are always ON whenever the mobile device is inside and outside a target building. As described in the example of this embodiment, the sensors for determining positions inside the building are turned ON only when the mobile device is detected as being close to the building. When the mobile device is not close to the building, the mobile device is at a sleep mode or turned OFF to save energy, if not needed for other use.

Furthermore, the angular velocity sensor is turned OFF or switched to a sleep mode, when the mobile device exists on a straight-line part on the map of the building, such as a path along which only rectilinear travel is possible. It is also possible to use the geomagnetic sensor to determine a direction. Then, the angular velocity sensor is turned ON at a curved part or a fork in the path. For example, the existing common three-axis angular velocity sensors consume energy of about 5 mA to 10 mA. Turning ON and OFF of the angular velocity sensor as necessary can reduce power consumption. Moreover, the existing common geomagnetic sensors consume energy of about 1 mA that is less than that of the common angular velocity sensors. Therefore, when high-accurate angular velocity detection and attitude detection by the angular velocity sensor are not necessary, it is possible to use only the geomagnetic sensor to detect the attitude of the mobile device.

FIG. 261 is a flowchart of processing of determining a position of the mobile device in the building. In Step 404*a*, it is determined whether or not area information (coordinate value) indicating respective areas such as a living room and a bedroom, are previously set in the map information (the map). If the determination in Step 404*a* is Yes, then the processing proceeds to Step 404*b*. In Step 404*b*, the mobile device obtains the area information indicating rooms on the map, with reference to the map information stored in the mobile device. In Step 404*c*, based on coordinate information of the mobile device and the obtained area information, the mobile device specifies a room where the mobile device exists ($X_1$, $Y_1$, $Z_1$<Xm, Ym, Zm<$X_2$, $Y_2$, $Z_2$). In Step 404*d*, the mobile device displays a room name (living room, for example) of the specified room on the screen of the mobile device. In Step 404*e*, with reference to the map information stored in the mobile device, the mobile device specifies controllable apparatuses existing in a direction pointed by the head of the mobile device. In Step 404*f*, the mobile device determines, based on a previously-set coordinate value of the equipped position of each of the specified apparatus, whether or not the apparatus is in the room where the mobile device exists. It is also possible to make the determination based on a previously-set room name, if any. In Step 404*g*, the mobile device generates an apparatus list to be presented to the user. In the apparatus list, apparatuses in the room where the mobile device exists are distinguished from apparatuses not in the room. For example, the different groups of the apparatuses are displayed in respective different color frames. Then, the processing proceeds to Circle 3 in FIG. 265. If the determination in Step 404*a* is No, then the processing proceeds to Step 404*h*. In Step 404*h*, with reference to the map information stored in the mobile device, the mobile device specifies controllable apparatuses existing in a direction pointed by the head of the mobile device. In Step 404*i*, the mobile device generates an apparatus list to be presented to the user. Then, the processing proceeds to Circle 3 in FIG. 265.

As described above, by recognizing a room where the mobile device is, it is possible to control a target apparatus (TV, for example) in the room, even if there are two TVs in different rooms.

FIG. 262 is a diagram showing an example of information indicating an area of a room on the 3D map.

If a shape of a room is complicated and is not a simple cuboid, such a room is considered as a combination of a plurality of cuboids.

FIG. 262 is a diagram showing a move of the mobile device near a reference point.

As shown in the drawing, when it is detected that the mobile device (406*a*) having the angular velocity sensor at a sleep mode (406*b*) enters an area (range) within 3 meters from the reference point, the angular velocity sensor is turned ON (406*c*) to detect the reference point with a higher accuracy. Until the mobile device enters the range, a position of the mobile device is recognized by sensors, such as the acceleration sensor and the geomagnetic sensor, on the map based on a move amount measured from an immediately prior reference point passed by the mobile device.

FIG. 264 is a diagram showing a location to be detected with a high accuracy in a direction of moving the mobile device.

For example, as shown in FIG. 264, a door between a bed room and an entrance is not far from a door between the bed room and a living room. Here, it is assumed that the mobile device enters a range (within 3 meters, for example) from a reference point (407*b*). At the reference point (407*b*), map-matching is difficult because inaccurate detection of user's turning causes the current position of the mobile device to vary depending on the respective rooms on the map. In this case, it is possible to increase an accuracy of the map matching, by operating the angular velocity sensor during a certain time period (for 10 seconds, for example).

FIG. 265 is a flowchart of processing of determining a position of the mobile device in the building. In Step 408*a*, the mobile device obtains a current coordinate value (current coordinate information) of the mobile device. In Step 408*b*, it is determined, based on the map, whether or not there is any reference point or any attention point in a range within 3 meters from the current coordinate information on the map. If the determination in Step 408*b* is Yes, then the processing proceeds to Step 408*c*. On the other hand, if the determination in Step 408*b* is No, then the processing returns to Step 408*a*. In Step 408*c*, the mobile device refers to a list of sensors to be used near the reference point or the attention point. In Step 408*d*, the mobile device obtains detection information detected by the target "angular velocity sensor" and time information (10 seconds, 5 seconds after arrival). In Step 408*e*, a sleep mode of the angular velocity sensor is released to start measurement. In Step 408*f*, if a pattern of a detection result of the sensor regarding the reference point or the attention point is detected (Yes), then the processing proceeds to Step 408*g*. In Step 408*g*, it is determined whether or not the predetermined time period of 5 seconds has passed. If the determination in Step 408*g* is Yes, then the processing is completed. On the other hand, if the determination in Step 408*g* is No, then the step is repeated until the determination in Step 408*g* is Yes. If the determination in Step 408*f* is No, then the processing proceeds to Step 408*h*. In Step 408*h*, it is determined whether or not a time period of 10 seconds has passed. If the determination in Step 408*h* is Yes, then the processing proceeds to Step 408*i*. In Step 408*i*, the mobile device counts a discovery rate within the time period (decrement by 1 count). In Step 408*j*, the time information on the list is overwritten to be extended. In the case where the list is obtained from the server, the mobile device notifies the server of the time information to be written over the list, and then the processing returns to Step 408*a*.

FIG. 266 is a table of moves of the mobile device near reference points and an attention point.

The table (409*a*) shown in FIG. 266 indicates sensors to be activated by the mobile device in order of priorities. The sensors are prioritized according to reference points and an attention point on the map. The attention point is a position near a range where map-matching errors are likely to occur. The table also indicates a time of activation and an operating time period during which each of the sensors is to be kept operating after detecting each of the reference points and the attention point. Based on the table, it is possible to realize higher-accuracy detection of the reference points and the attention point. Furthermore, the table shows a discovery rate within the operating time period. The discovery rate indicates a percentage of discovery of each of the reference points and the attention point, within the operating time period since the mobile terminal enters the range near the reference point or the attention point and activates the sensor indicated in the table. The table further indicates an error rate. The error rate indicates a rate of case(s) where it is determined, based on the detection data after map-matching, an actual position is different from a result of map-matching. Therefore, the operating time period is set longer when the discovery rate is lower, while the operating time period is set shorter when the discovery rate is higher. As a result, it is possible to reduce the operating time period to save energy. Moreover, if a rate of map-matching errors is high, a distance for detecting the range near the reference point or attention point is extended (from 3 meters to 5 meters), instead of extending the operating time period of the sensor. As a result, it is possible to increase an accuracy of discovery of the reference points and the attention point. On the other hand, if a rate of map-matching errors is low, the distance for detecting the range is shortened to decrease the operating time period of the sensor, thereby saving energy.

FIG. 267 is a flowchart of processing of determining a position of the mobile device in the building. At the beginning, in Step 410*a*, the mobile device determines whether or not the mobile device detects (a) coordinate information of a range near the user's home by GPS, (b) an access point of a wireless LAN in the user's home, or (c) one of access points of the wireless LAN in the user's home which have previously been detected in the user's home. If the determination in Step 410*a* is No, then the mobile device waits until the determination becomes Yes. If the determination in Step 410*a* is Yes, then in Step 410*b*, the mobile device specifies a sensor for detecting a reference point passing in entering the home, from a reference point detection sensor priority list shown in FIG. 268 that indicates priorities of sensors for detecting reference points. Here, it is assumed that the mobile device specifies the acceleration sensor in Step 410*c*, and the acceleration sensor detects G (acceleration) in a Z-axis direction which indicates a registered acceleration pattern (for example, three steps of stairs). In this case, the mobile device determines that the mobile device is currently positioned at previously-registered coordinate information (coordinate value) of the reference point. Therefore, the coordinate value is set in the mobile device. Then, the processing proceeds to Circle 4 in FIG. 269.

Here, in addition to Step 410*c*, a direction of move on the stairs is determined based on G (acceleration) on a moving direction axis (X-axis) which is detected by the geomagnetic sensor. Then, it is determined whether or not the determined direction is the same as the direction of the stairs which is previously detected and registered on the map. If the detected direction is not the same as the registered direction of the stairs, it is possible to determine that the stairs are not a target reference point.

FIG. 268 is a list indicating priorities of sensors for detecting each of reference points.

As shown in the list 411*a*, priorities of sensors to be activated are varied depending on a kind of a target reference point. For example, when an entrance door is to be detected, the sound sensor can correctly detect the entrance door by examining a similarity of sound caused by a key hole of the entrance door. In the case of a door of a living room, however, since the door of the living room does not make loud sound and also the user ascends one step to a height of the floor in entering the living room, detection of a vertical move by the acceleration sensor is prioritized over the sound sensor.

With reference to the list 411*a*, two highest sensors in the order of priorities in the list are operated normally. If the two highest-priority sensors do not provide effective detection, the third priority sensor is also operated. On the other hand, if the two highest-priority sensors are enough to provide effective detection, only the highest-priority sensor is used. Depending on characteristics of a reference point, sensors to be operated are selected. As a result, it is possible to perform the detection using only necessary sensors, thereby saving energy consumption and increasing the detection accuracy.

FIG. 269 is a flowchart of processing of determining a position of the mobile device in the building. For example, in Step 412*a*, if an amount of acceleration components in a minus direction along the Z-axis is large (Yes), it is determined in Step 412*b* that the user is ascending stairs. In Step 412*c*, the number "n" of user's steps on the stairs is counted. In Step 412*d*, a position of the user is determined based on a radio field strength and a phase of access points of the wireless LAN, and thereby stairs A is specified from among plural sets of stairs. In Step 412*f*, if the number "n" of the user's steps reaches the number "m" of steps of the stairs A that is obtained from the memory in the server or the mobile device, or if the atmospheric pressure sensor detects a certain atmospheric pressure (Yes), then the processing proceeds to Step 412*g*. In Step 412*g*, it is determined that the user is at the top of the stairs, then coordinate information of the top step and a coordinate accuracy evaluation point Vs of the coordinate information are obtained from the server, and the processing proceeds to Circle 5 in FIG. 270. On the other hand, if the determination in Step 412*f* is No, then the processing returns to Step 412*c*. If the determination in Step 412*a* is No, then the processing proceeds to Step 412*h*. In Step 412*h*, if an amount of acceleration components in a plus direction along the Z-axis is large (Yes), then it is determined in Step 412*i* that the user is descending stairs. In Step 412*k*, the number of user's steps on the stairs is counted. In Step 412*m*, a position of the user is determined based on a radio field strength and a phase of access points of the wireless LAN, and thereby stairs A is specified from among plural sets of stairs. In Step 412*n*, if the number of the user's steps reaches the number "m" of steps of the stairs A that is obtained from the memory in the server or the mobile device, or if the atmospheric pressure sensor detects a certain atmospheric pressure (Yes), then the processing proceeds to Step 412*p*. In Step 412*p*, it is determined that the user is at the bottom of the stairs, then coordinate information of the bottom step and a coordinate accuracy evaluation point Vs of the coordinate information are obtained from the server, and the processing proceeds to Circle 5 in FIG. 270. On the other hand, if the determination in Step 412*p* is No, then the processing returns to Step 412*k*.

FIG. 270 is a flowchart of processing of determining a position of the mobile device in the building. In Step 413*a*, the coordinate accuracy evaluation point Vm of the coordinate information measured by the mobile device is retrieved from the mobile device. In Step 413*b*, if Vm is greater than Vs, in other words, if the coordinate information registered in the server is accurate more than the coordinate information stored in the mobile device (Yes), then the processing proceeds to Step 413*c*. In Step 413*c*, the coordinate information stored in the mobile device is rewritten by the coordinate information registered in the server. In Step 413*g*, the setting of the coordinate information of the reference point at the stairs has been completed. Then, the processing returns to Circle 2 in FIG. 261. If the determination in Step 413*b* is No, then the processing proceeds to Step 413*d*. In Step 413*d*, the coordinate information stored in the mobile device is not rewritten by the coordinate information registered in the server. In Step 413*e*, if an automatic rewriting flag for automatically rewriting the coordinate information registered in the server as the coordinate information stored in the mobile device is ON, or if the user agrees (OK) with the screen display "Can it be written?" (Yes), then the processing proceeds to Step 413*f*. In Step 413*f*, the coordinate information registered in the server is rewritten as the coordinate information stored in the mobile device. In Step 413*g*, the setting of the coordinate information of the reference point at the stairs has been completed. Then, the processing returns to Circle 2 in FIG. 261. If the determination in Step 413*e* is No, then in Step 413*g*, the setting of the coordinate information of the reference point at the stairs has been completed. Then, the processing returns to Circle 2 in FIG. 261.

FIG. 271 shows graphs each indicating detection data in the Z-axis (vertical) direction which is detected by the acceleration sensor.

As shown in a pattern 414*a* in FIG. 271, when the user ascends stairs, an acceleration is high in a minus direction along the vertical Z-axis which is an ascending direction, and such acceleration is periodically detected (414*a*). On the other hand, when the user descends stairs, an acceleration is high in a plus direction along the vertical Z-axis which is a descending direction, and such acceleration is periodically detected (414*b*). Moreover, when the user walks horizontally, an acceleration in the minus direction and an acceleration in the plus direction are almost the same along the vertical direction (414*c*). In the graphs in FIG. 271, gravity measured by the acceleration sensor in the steady state is not considered to simplify the explanation.

FIG. 272 is a flowchart of processing of determining a position of the mobile device in the building. At the beginning, in Step 415*a*, the mobile device determines whether or not the mobile device detects (a) coordinate information of a range near the user's home by GPS, (b) an access point of a wireless LAN in the user's home, or (c) one of access points of the wireless LAN in the user's home which have previously been detected in the user's home. If the determination in Step 415*a* is No, then the mobile device waits until the determination becomes Yes. If the determination in Step 415*a* is Yes, then in Step 415*b*, the mobile device specifies a sensor for detecting reference points in user's entrance from the reference point detection sensor priority list 411*a*. In Step 415*c*, if the sound sensor is specified from the obtained list, the mobile device of the user (hereinafter, referred to as a "user's mobile device") accesses a previously-registered mobile device (for example, a mobile device of a family member, hereinafter, referred to as "family mobile device") that is going to enter the building (the user's home), via proximity wireless communication such as a cellular network, a wireless LAN, or a booster transformer (BT). Thereby, the user's mobile device inquires the family mobile device whether or not the family mobile device is near the building. In Step 415*d*, if there is such a mobile device (the family mobile device, for example) near the user's mobile device and the family mobile device is permitted to enter the building to receive position determination services, the user's mobile device inquires a coordinate value (coordinate information) of the family mobile device. Then, the user's mobile device determines whether or not the a distance between the position of the family mobile device (the obtained coordinate value) and a position of a reference point (a reference value) is shorter than a distance between the position of the user's mobile device and the position of the reference point. If the distance between the family mobile device and the reference point is shorter than the distance between the user's mobile device and the reference point, then the processing proceeds to Step 415*f*. In Step 415*f*, the user's mobile device examines the reference point detection sensor priority list to select another detection method except sound. In Step 415*g*, by the selected detection method, the user's mobile device detects that the user's mobile device moves to the reference point, then sets coordinate value (coordinate information) of the reference point to the user's mobile device, and the processing proceeds to Circle 6 in FIG. 273. If it is determined in Step 415*d* that the distance between the family mobile device and the reference point is longer than the distance between the user's mobile device and the reference point, then the processing proceeds to Step 415*e*. In Step 415*e*, the user's mobile device determines whether or not sound emitted at the current position of the user's mobile device matches previously-registered sound (sound of a door knob, or sound of a key). If the determination in Step 415*e* is Yes, the user's mobile device determines that the current position of the user's mobile device is a reference point and sets a coordinate value of the reference point into the user's mobile device. Then, the processing proceeds to Circle 6 in FIG. 273.

FIG. 273 is a flowchart of processing of determining a position of the mobile device in the building. In Step 416*a*, an amount of a move of the mobile device from a reference point is calculated for each predetermined time period (10 ms) by the acceleration sensor, the angular velocity sensor, and the geomagnetic sensor, so that an estimated coordinate value (estimated coordinate information) of the mobile device is registered in the mobile device for each of the calculation by using an automatic navigation method. In Step 416*b*, the mobile device (i) detects the user's walk based on a results of detecting the Z-axis accelerations, (ii) detects a time at which the user's foot touches the floor, and (iii) detects one or more sounds occurred at a target time, and (iv) detects a moment at which sound is changed. In Step 416*c*, a pattern of the sound change is compared with previously-registered patterns resulting from differences between floors, such as a difference between a wooden floor and a carpet. If the pattern is similar to one of the previously-registered patterns, then the processing proceeds to Step 416*d*. In Step 416*d*, a direction of the move of the mobile device (hereinafter, referred to as a "moving direction") is detected by the geomagnetic sensor and the angular velocity sensor. Then, coordinate information of the mobile device is corrected to coordinates of an intersection between (a) the moving direction and (b) a straight line drawn from a coordinate value (coordinate information) that is currently registered as current position information in the mobile device (or corrected to a position that is the closest to the intersection). Then, the processing proceeds to Circle 7 in FIG. 274. On the other hand, if the pattern is not similar to any of the previously-registered patterns, then the processing proceeds to Circle 7 in FIG. 274.

FIG. 274 shows graphs and a diagram for showing a relationship between detection data and a walker in the acceleration Z-axis (vertical) direction.

As shown in 417*a*, a walking state can be detected based on acceleration. By detecting times (417*b*, 417*c*) at each of which a foot touches a floor, it is possible to extract, based on the detected time, only a footstep sound from sound occurred in walking. As a result, a difference of footstep sounds can be detected more efficiently. As shown in 417*d*, when the user moves from a living room having a wooden floor to an European-style room having a carpet floor, it is determined that a time of the footstep sound change point 417*e* is a time where the user walks across a boundary between the living room and the European-style room (417*f*). As a result, a coordinate value (coordinate information of a current position) of the mobile device is corrected based on the map.

FIG. 275 shows a diagram showing an example of moves in the building.

The mobile device detects a reference point 418*a*, and can calculate an accuracy of a coordinate value of a position of a TV-A based on (a) an amount 418*b* of turning towards the TV-A and (b) an accuracy of a coordinate value of the reference point 418*a* on the map. More specifically, if the turning amount 418*b* is large, the accuracy of the coordinate value of the position of the TV-A which is recognized by the mobile device is set low. On the other hand, if the turning amount 418*b* is small, the accuracy is set high. The resulting accuracy information of the reference point is registered.

Likewise, for a move from the TV-A to a TV-B, an accuracy of a coordinate value of a position of the TV-B is calculated based on (a) the accuracy information of the coordinate value of the TV-A and (b) a turning amount or a move amount along the Z-axis (418*c*), and eventually the calculated accuracy information is registered.

FIG. 276 is a table indicating a path of the mobile device from a reference point to a next reference point. In the table 419*a*, path information includes: (a) original reference point accuracy information that is accuracy information of an immediately-prior reference point which the mobile device has passed; (b) a move amount; (c) the number of steps (step number) calculated by the acceleration sensor; (d) a total turning amount that is calculated by the angular velocity sensor and the geomagnetic sensor; (e) an elapsed time; and (f) a total amount of a vertical move along the Z-axis. An accuracy evaluation point (coordinate accuracy evaluation point) of a current position of the mobile device is calculated based on values of the above pieces of information.

FIG. 277 shows a table and a diagram for explaining the original reference point accuracy information. As shown in the table 420*a*, the reference point A such as an entrance, the TV-A, the TV-B, and their reference point accuracy information are registered. As shown in an example in FIG. 277, a coordinate accuracy evaluation point of the TV-A is calculated based on the coordinate accuracy evaluation point of the reference point A and a path 1 (420*b*). A coordinate accuracy evaluation point of the TV-B is calculated based on the coordinate accuracy evaluation point of the TV-A and a path 2 (420*c*). The calculated coordinate accuracy evaluation points are stored as map information and kept updating. The updating may be performed for each time the mobile device reaches a target reference point. It is also possible to accumulate coordinate accuracy evaluation points of a target reference point, predetermined times, and calculate statistics from them. For example, 10 coordinate accuracy evaluation points are averaged.

FIG. 278 is a flowchart of processing of determining a position of the mobile device in the building. In Step 421*a*, a first reference point is detected. In Step 421*b*, a coordinate value of a current position of the mobile device is rewritten by a coordinate value of the first reference point. In Step 421*c*, coordinate accuracy evaluation point information that indicates an accuracy of the coordinate value of the first reference point is obtained from reference point information. The first reference point is considered as an original reference point in a path list. In Step 421*d*, a move from the first reference point is measured by the angular velocity sensor, the geomagnetic sensor, and the acceleration sensor, and then stored. In Step 421*e*, it is determined whether or not the mobile device arrives at a second reference point or touches an apparatus having a RF-ID function for communication which is located at the second reference point. If the determination in Step 421*e* is Yes, then the processing proceeds to Step 421*f*. In Step 421*f*, the mobile device obtains information of the second reference point (reference point information) or information of the apparatus (apparatus information). Then, in Step 421*g*, the mobile device obtains coordinate accuracy evaluation point information of the second reference point or the apparatus based on the reference point information or the apparatus information. The coordinate accuracy evaluation point information is obtained from the server (SEG, for example) or from the mobile device itself, in the same manner as described in the case where the mobile device touches the apparatus, such as a home appliance having a RF-ID function, which is located at the second reference point. Then, the processing proceeds to Circle 8 in FIG. 279. On the other hand, if the determination in Step 421*e* is No, then the processing returns to Step 421*d*.

FIG. 279 is a flowchart of processing of determining a position of the mobile device in the building. In Step 422*a*, a coordinate accuracy evaluation point of the second reference point or the apparatus is calculated based on the path information. In Step 422*b*, if the coordinate accuracy evaluation point calculated by the mobile device is higher than coordinate accuracy evaluation point that has been previously calculated and registered (Yes), then the processing proceeds to Step 422*c*. In Step 422*c*, 3D coordinate information and the coordinate accuracy evaluation point of the second reference point or the apparatus which are currently calculated are written over 3D coordinate information and the coordinate accuracy evaluation point which are registered. If the determination in Step 422*b* is No, then the processing proceeds to Step 422*d*. In Step 422*d*, the 3D coordinate information of the second reference point or the apparatus which is registered is obtained. In Step 422*e*, the obtained 3D coordinate information is overwritten as a coordinate value of a current position of the mobile device. Then, the processing returns to Circle 2 in FIG. 261.

The following describes a position determination method regarding a lift with reference to FIGS. 271 and 272. First, FIG. 271 is explained. In Step 423*a*, it is determined whether or not the user holding the mobile device arrives at a position of a lift. If the determination in Step 423*a* is Yes, then the processing proceeds to Step 423*b*. Otherwise (No in Step 423*a*), Step 423*a* is repeated.

In Step 423*b*, it is determined whether or not the user holding the mobile device enters the lift. If the user holding the mobile device enters the lift (Yes in Step 423*b*), then the processing proceeds to Step 423*c*. Otherwise (No in Step 423*b*), Step 423*b* is repeated.

If there are a plurality of lifts having different performance in the building, it is determined in Step 423*c*, based on position information, which lift the user enters and on which floor (floor number) the lift currently exists. In Step 423*d*, the mobile device obtains "characteristic information" of the target lift from the server. The characteristic information includes: (a) a time period required to ascend or descend from the n-th floor to the m-th floor; (b) information of Ts and load change characteristics; (c) an absolute or relative height of each floor; and (d) a position of a lift door on each floor. In Step 423*e*, a vertical acceleration along the Z-axis is measured. In Step 423*f*, if an acceleration in the same direction as the gravity direction is increased, or if atmospheric pressure is decreased, it is determined that the user starts ascending in the lift. Therefore, measurement of an elapsed time of the ascending starts. In Step 423*g*, if an acceleration in the same direction as the gravity direction is decreased, or if increase of atmospheric pressure stops, it is determined that the ascending stops. Therefore, the measurement of the elapsed time is stopped to calculate the elapsed time TA. In Step 423*h*, information of a "time period required from the n-th floor to the m-th floor" is calculated based on (a) the floor from which ascending starts, (b) the elapsed time TA, and (c) the required time period information of the lift, and then information of a "floor (floor number) at which the mobile device arrives" is determined based on the "time period required from the n-th floor to the m-th floor". In Step 423*i*, it is determined whether or not the mobile device is moved outside the lift. If the determination in Step 423*i* is Yes, then the processing proceeds to Circle 9 in FIG. 281.

On the other hand, if the determination in Step 423*i* is No, then the processing returns to Step 423*e*.

It should be noted that, in the case where the lift is descending, detected values of data such as an acceleration and atmospheric pressure are opposite to those in the case where the lift is ascending. Therefore, the floor at which the mobile device arrives is determined in the same manner as described with the above steps.

It should also be noted that, in the case where the lift is stopped for someone before arriving at the user's target floor, a move amount from start of ascending or descending to each stop is considered until the user holding the mobile device eventually goes out of the lift.

Next, FIG. 281 is explained. In Step 424*a*, height information or floor number information of the above-described "floor (floor number) at which the mobile device arrives" is recorded as Z information in the current 3D coordinate information of the mobile device. In Step 424*b*, it is determined in Step 424*b* whether or not the user holding the mobile device goes out by a few steps from a door of the lift. If the determination in Step 424*b* is Yes, then the processing proceeds to Step 424*c*. Otherwise (No in Step 424*b*), Step 424*b* is repeated. In Step 424*c*, the mobile device obtains (a) position information of an entrance of the floor and (b) coordinate accuracy evaluation point Vs of the entrance, which are previously stored in the server or the memory in the mobile device. In addition, the mobile device obtains coordinate information of the current position of the mobile device measured by sensors and the like in the mobile device. Then, the processing proceeds to Circle 5 in FIG. 270. In this case, if the coordinate accuracy evaluation point Vs of the entrance is higher than the coordinate accuracy evaluation point Vm of the entrance which is stored in the mobile device, the coordinate information (coordinate value) of the entrance is written over the coordinate information stored in the mobile device to re-set information of the reference point (the entrance). As a result, the accuracy of the coordinate information stored in the mobile device is increased. After that, as a distance and a time period of move of the mobile device are increased, the coordinate accuracy evaluation point Vm stored in the mobile device is decreased if a next reference point is not set. The decrease is executed by a program corresponding to characteristics of a model of the mobile device. The program is downloaded by the mobile device.

In the case where the user holding the mobile device gets on an escalator, the mobile device detects both (a) an acceleration upwards along the Z-axis, which is averagely steady, and (b) an acceleration in a move direction, which is also averagely steady. The accelerations show a considerably characteristic pattern as long as the user holding the mobile device does not walk up an escalator. Therefore, based on detection of such a pattern, it is possible to determine that the user gets on an escalator and ascends or descends. Then, a step-number sensor detects that the user gets out of the escalator, and therefore information of the reference point can be re-set.

As described above, it is possible to obtain the floor number and height information of the floor at which the user holding the mobile device arrives by a lift.

[Embodiment 24]

In Embodiment 24, the description is given for processing performed when a mobile device touches a NFC tag of a home appliance with reference to FIGS. 286 to 291. Here, the mobile device has a NFC reader/writer, the home appliance has the NFC tag and a home appliance CPU, and a server manages information of the mobile device and information of the home appliance.

With reference to FIG. 286, in Step 951*v*, the home appliance CPU included in the home appliance regularly records data regarding the home appliance onto a memory in the NFC tag. Therefore, when the mobile device (hereinafter, referred to also as a "mobile terminal") accesses the tag of the home appliance, the home appliance can provide the mobile terminal with information stored in the home appliance which can be read not by the mobile terminal but only by the home appliance CPU.

In Step 951*a*, the mobile terminal (mobile device) is activated.

In Step 951*b*, the mobile terminal determines whether or not an application program for operating the home appliance has already been activated on the mobile terminal. If the application program has already been activated (Yes at S951*b*), then in Step 951*c*, the display terminal displays "Please touch" on the display device of the mobile terminal, in order to notify the user of that the mobile terminal is ready for touching the tag of the home appliance.

In Step 951*d*, the mobile terminal determines whether or not the user makes the mobile terminal touch the NFC tag of the home appliance. If it is determined that the user makes the mobile terminal touch the NFC tag (Yes in Step 951*d*), then the processing proceeds to Step 951*e*. In Step 951*e*, the mobile terminal issues a request for reading data from the tag. In Step 951*f*, the home appliance reads the data from the memory in the tag.

In Step 951*g*, the home appliance determines whether or not to access the home appliance CPU. If it is determined that it is necessary to access the home appliance CPU (Yes at S951*g*), then the processing proceeds to Step 951*h*. In Step 951*h*, the home appliance accesses to the home appliance CPU. In Step 951*j*, the home appliance reads information by accessing the home appliance CPU. In Step 951*k*, the home appliances transmits provides the information read from the home appliance CPU, to the memory in the tag of the home appliance, or stores the information in the home appliance. Then, the processing proceeds to Step S951*m*. Therefore, when the mobile terminal accesses the tag of the home appliance, the home appliance can provide the mobile terminal with the information stored in the home appliance which can be read not by the mobile terminal but only by the home appliance CPU.

If the determination in Step 951*d* is No, then Step 951*d* is repeated. On the other hand, if the determination in Step 951*d* is Yes, then the processing proceeds to Step S951*e*.

If the determination in Step 951*g* is No, then the processing proceeds to Step 951*m*.

In Step 951*m*, the home appliance transmits the required information to the mobile terminal. In Step 951*n*, the mobile terminal receives the information including a tag ID, a signature, a key ID, an apparatus model, an error code, a use history (the number of uses), log data, a product serial number, an operating state (current state) of the home appliance, a URL, position information, an on-sale mode identifier, and the like.

In Step 951*q*, the mobile terminal determines whether or not the mobile terminal is within the service range. If the determination in Step 951*q* is Yes, then the processing proceeds to Step 951*r*. In Step 951*r*, the mobile terminal transmits, to the server having an address of the above-mentioned URL, information including a user ID, the tag ID, the signature, the key ID, the apparatus model, the error code, the use history (the number of uses), the log data, the operating state (current state) of the home appliance, the position information, and the on-sale mode identifier. In Step 951*s*, the server receives the information transmitted from the mobile terminal.

If the determination in Step 951*q* is No, then the processing proceeds to Circle 11 in FIG. 287.

The following explains FIG. 287.

In Step 952*a*, the mobile terminal determines whether or not the mobile terminal has an application program corresponding to the apparatus model received from the touched home appliance. If the determination in Step 952*a* is Yes, then in Step 952*i*, the mobile terminal activates the application program. Therefore, when the mobile terminal holds the apparatus model information and the application program corresponding to the apparatus model, the mobile terminal can activate the application program even outside the service range.

If the determination in Step 952*a* is No, then the processing proceeds to Step 952*b*. In Step 952*b*, the mobile terminal activates a general local processing routine. In Step 952*c*, the mobile terminal displays a part of the information read from the tag of the home appliance. Therefore, even if the mobile terminal is outside the service range and does not have the application program corresponding to the apparatus model of the touched home appliance, the mobile terminal can present the user with the information obtained from the home appliance.

In Step 952*d*, the mobile terminal determines whether or not the error code indicates “error”. If the determination in Step 952*d* is Yes, then the processing proceeds to Step 952*e*. In Step 952*e*, the mobile terminal determines whether or not the mobile terminal holds pieces of attribute information each indicating details and the like of a corresponding error code. If the determination in Step 952*e* is Yes, then the processing proceeds to Step S952*f*.

If the determination in Step 952*e* is No, then the processing proceeds to Step 952*g*. In Step 952*g*, the mobile terminal displays the apparatus model and the error code or letters converted from the error code, and the processing proceeds to Step S952*h*. Therefore, even if the mobile terminal does not hold pieces of attribute information each indicating details and the like of the corresponding error code, the mobile terminal can present the user with the error information of the home appliance.

In Step 952*f*, the mobile terminal displays information for explaining details of the error based on the error code, and the processing proceeds to Step S952*h*. Therefore, even if the mobile terminal is outside the service range, the mobile terminal holds relationship information indicating a relationship between each error code and error details, and thereby converts an error code provided from the touched home appliance to corresponding error details. As a result, the mobile terminal can present the user with error details based on the error code provided from the home appliance, so that the user can easily understand the error. When a relationship between an error code and error details is to be changed, it is possible that the mobile terminal receives also a manufacturer code from the tag of the home appliance, then manages a relationship table indicating a relationship between each error code and error details for each manufacturer, and changes the relationship. If common error codes for apparatuses are defined by each manufacturer, it is also possible that the mobile terminal receives also a manufacturer code from the tag of the home appliance, then manages a relationship table indicating a relationship between each error code and error details for each manufacturer, and changes the error details. As a result, it is possible to decrease the number of kinds of errors registered in the mobile terminal. Furthermore, it is possible that the mobile terminal manages a relationship table indicating a relationship among a manufacturer code of a manufacturer, an apparatus model of the manufacturer, an error code, and error details, and changes the error details.

In Step 952*h*, the mobile terminal determines whether or not the mobile terminal holds a telephone number, an e-mail address, or a URL for inquiring an apparatus model of the home appliance. If the determination in Step 952*h* is Yes, then the processing proceeds to Step S954*a* of Circle 4 in FIG. 289.

If the determination in Step 952*h* is No, then the processing proceeds to Step S954*b* of Circle 10 in FIG. 289.

With reference to FIG. 288, in Step 953*a*, the mobile terminal determines whether or not the on-sale mode identifier provided from the server or the tag of the home appliance is ON. If the determination in Step 953*a* is Yes, then the processing proceeds to Step 953*b*. In Step 953*b*, the mobile terminal displays a menu screen.

An on-sale mode represented by the on-sale mode identifier indicates that the home appliance is on sale in an electronics retail store. In general distribution of home appliances, products are manufactured by a manufacturer, then a part of them are stored in a warehouse, and a pat selected at random from the stored products are displayed in electronics retail stores. Consumers checks a usability or design of such a displayed product in the electronics retail store. However, there is a problem described below.

The processing from Step 953*d* offers advantages to the manufacturer, because the processing from Step 953*d* enables the user to easily perform user registration only by making the mobile terminal touch a target home appliance. Consumers, who touch a product in an electronics retail store, do not always decide to buy the product. If a malicious consumer does not intend to buy a home appliance displayed in a store but makes his/her mobile terminal touch the home appliance, the touching results in registration of the consumer as a user of the home appliance. In recent years, user registration is vital information for a manufacturer to specify purchasers of products to be recalled. Therefore, many manufacturers offer financial or additional merits to purchasers who perform user registration. Therefore, such a situation would increase malicious consumers attempting to perform user registration for products which the consumers do not intend to buy. Technologies of preventing such malicious user registration have been highly demanded. In Steps 953*a* and 953*b*, based on the on-sale mode identifier held in the server or the tag of the home appliance, the mobile terminal determines whether or not the home appliance is on sale (at the on-sale mode). If the home appliance is at the on-sale mode, the mobile terminal prohibits user registration for the home appliance and displays a menu screen to notify the on-sale mode. As a result, it is possible to prevent malicious user registration. It is possible that the on-sale mode is changed or referred to by the server. In this case, the server does not need to directly touch the target home appliance. Therefore, the sever can change the on-sale mode for a large number of home appliances at once, or can control the home appliances in distance locations. It is also possible that the on-sale mode is changed or referred to by the home appliance or the tag of the home appliance. In this case, it is possible to change an on-sale mode for each of home appliances displayed in stores, for example.

Referring back to Step 953*a*, if the determination in Step 953*a* is No, then the processing proceeds to Step 953*c*. In Step 953*c*, the mobile terminal searches a database for a target home appliance based on the tag ID and the apparatus model, and thereby determines whether or not the home appliance has already been registered (in other words, whether or not user registration has already been performed for the home appliance). If the determination in Step 953*d* is Yes, then the processing proceeds to Step 953*e*. In Step 953*e*, the mobile terminal determines whether or not a user ID of the mobile terminal and the user ID registered in the server are identical or belong to the same family. If the determination in Step 953*e* is Yes, then the processing proceeds to Step 953*f*. In Step 953*f*, the mobile terminal displays a menu screen corresponding to a general apparatus model. Therefore, if the mobile terminal has already performed user registration for the home appliance, the mobile terminal does not need to display an unnecessary user registration screen again and again to a purchaser of the home appliance. Recently, almost everyone has one or more mobile terminals. Therefore, for example, if the user performs user registration for a purchased washing machine by using a mobile terminal of his/her father, and makes a mobile terminal of his/her mother touch a NFC tag of the washing machine, it is wrongly determined that a different user requests user registration. As a result, the mobile terminal of the user’s mother displays a user registration change screen, even if the father and the mother live in the same home. In order to solve the above problem, as indicated in Step 953*e*, the user ID of the mobile terminal of the user is associated with user IDs of the mobile terminals of the family members of the user. Therefore, in the above example, if it is determined that the mobile terminal of the user's mother and the mobile terminal of the user's father belong to the same family, it is determined that the user registration has already been performed for the washing machine correctly. As a result, the mobile terminals of the user's family do not need to display a user registration screen again and again.

If the determination in Step 953*d* is No, then the processing proceeds to Step 953*g*. In Step 953*g*, the mobile terminal displays the user registration screen. In Step 953*h*, the mobile terminal determines whether or not there is position information of a current position of the mobile terminal which is detected by the GPS or the like. If the determination in Step 953*h* is Yes, the processing proceeds to Step 953*j*. In Step 953*j*, the mobile terminal determines whether or not the mobile terminal is positioned at a specific region such as a building in which a target apparatus (an apparatus model of a target home appliance) is on sale. The processing proceeds to Circle 6 in FIG. 291.

If the determination in Step 953*e* is No, then the processing proceeds to Circle 5 in FIG. 290.

The following explains FIG. 289.

In Step 954*a*, the mobile terminal displays, on its screen, the above-mentioned telephone number, e-mail address, or URL for inquiring the apparatus model. In Step 954*b*, the mobile terminal is connected to the server and determines whether or not there is data to be exchanged with the server. If the determination in Step 954*b* is Yes, then the processing proceeds to Step 954*c*. Otherwise (No in Step 954*b*), the processing proceeds to Step 954*d*, and is completed.

In Step 954*c*, the mobile terminal displays "Move to the service range" to persuade the user to move into the service range. In Step 954*e*, the mobile terminal causes the data (information) read from the tag of the home appliance to be in a "savable state" where the data can be saved in a memory. In Step 954*f*, the mobile terminal determines whether or not the mobile terminal is in the service range. If the determination in Step 954*f* is Yes, then the processing proceeds to Step 954*g*. Otherwise (No in Step 954*f*), then the processing returns to Step 954*c*.

In Step 954*g*, the mobile terminal is connected to the server having the URL recorded on the tag of the home appliance or on the mobile terminal. In Step 954*h*, user authentication is performed. In Step 954*j*, the mobile terminal transmits, to the server, the data read from the tag or information generated based on the data, or the mobile terminal processes the data or the information by executing an application program provided from the server.

As a result, even if the mobile terminal touches the home appliance outside the service range, after the user moves into the service range, the mobile terminal can display a menu screen regarding user authentication, user registration/change, or the target apparatus.

The following explains FIG. 290.

In Step 955*a*, the mobile terminal (here, it is assumed that the mobile terminal does not belong to a target building) determines whether or not it is possible to determine a current position of the mobile terminal by using the GPS or the like. If the determination in Step 955*a* is Yes, then the processing proceeds to Step 955*b*. In Step 955*b*, the mobile terminal determines whether or not the determined position (position information) of the mobile terminal almost matches one of pieces of position information registered in the server. If the determination in Step 955*b* is Yes, then the processing proceeds to Step 955*c*.

In Step 955*c*, the mobile terminal determines whether or not the matching position information in the server is assigned with an identifier indicating that "Other users (other user IDs) are accepted". If the determination in Step 955*c* is Yes, then the processing proceeds to Step 955*d*. In Step 955*d*, the mobile terminal is set to be at a guest mode. On the other hand, if the determination in Step 955*c* is No, then the processing proceeds to Step 955*e* and is terminated.

At the guest mode, the mobile terminal (for example, a mobile terminal of a visitor except family members of the user) can operate only a predetermined home appliance at one of the positions registered in the server. For example, it is assumed that a visitor except family members of the user visits the user's home. Here, it is also assumed that the user wishes to allow the visitor to use a mobile terminal of the visitor as a remote controller of a TV in the user's home, but does not want to let anyone except the family members see a laundry history of a user's washing machine. Under such assumption, the TV is assigned with the identifier indicating "Other users (other user IDs) are accepted" which is currently ON, while the washing machine is assigned with the same identifier which is currently OFF. Furthermore, the introduction of the guest mode allows any visitor to use a part of functions of his/her mobile terminal. For example, the gust mode inhibits anyone except family members in a target home from seeing a laundry history of a washing machine in the home, but permits anyone to display an error code of the washing machine on his/her mobile terminal.

If the determination in Step 955*b* is No, then the processing proceeds to Step 955*f*. In Step 955*f*, the mobile terminal displays, on its screen, a question such as "Has the address been changed?" or "Has the owner been changed?" If an answer of the question is Yes, then the processing proceeds to Step 955*g*. In Step 955*g*, the mobile terminal displays an address change menu or an user change menu.

As a result, this offers the following advantages. For example, it is assumed that the user moves with his/her home appliances to a new home and therefore a user's address registered in user registration at purchase of the home appliances is changed. Under the assumption, if the user forgets to register a new address in the user registration, the mobile terminal of the user can automatically persuade the user to perform the user registration.

If the determination in Step 955*f* is No, then the processing proceeds to Step 955*h* to be continued.

The following describes a variation of this embodiment in the case where a home appliance is on sale in an electronics retail store, with reference to FIG. 291.

In Step 956*a*, the mobile terminal determines whether or not the mobile terminal is in a target region. If the determination in Step 956*a* is Yes, then the processing proceeds to Step 956*b*. Otherwise (No in Step 956*a*), the processing proceeds to Step 956*c*. In Step 956*c*, the mobile terminal performs user registration for a target home appliance in the target region.

Here, the target region is space information generally indicating one of floors of an electronics retail store. The target region is indicated by GPS information or the like. The determination in Step 956*a* may be made based on a current position of the mobile terminal, or a beacon of the store. The determination in Step 956*a* may also be made with reference to home appliance distribution route information and a present time.

This produces the following advantages. For example, if a home appliance is displayed in a retail store, it is possible to prevent a malicious user from performing malicious user registration for the displayed home appliance which the user has not yet purchased.

In Step 956*b*, the mobile terminal (having a user ID) and the server performs user authentication. In Step 956*d*, the mobile terminal determines whether or not the user authentication is successful (OK). If the determination in Step 956*d* is Yes, then the processing proceeds to Step 956*e*. Otherwise (No in Step 956*d*), then the processing proceeds to Step 956*f* and is terminated.

In Step 956*e*, the mobile terminal requires input of a password of the retail store or a manufacturer of the target home appliance.

In Step 956*g*, authentication is performed, and the processing proceeds to Step 956*h*.

In Step 956*h*, the mobile terminal determines whether or not the authentication is successful (OK). If the determination in Step 956*h* is Yes, then the processing proceeds to Step 956*j*. Otherwise (No in Step 956*h*), then the processing proceeds to Step 956*k* and is terminated.

In Step 956*j*, the mobile terminal determines whether or not the password is correct. If the determination in Step 956*j* is Yes, then the processing proceeds to Step 956*m*. Otherwise (No in Step 956*j*), then the processing proceeds to Step 956*n* and is terminated.

In Step 956*m*, the mobile terminal is switched to be at the on-sale mode. In Step 956*p*, the mobile terminal inquires the user whether or not to record an identifier of the on-sale mode (on-sale mode identifier) onto the tag of the home appliance or onto the server.

If the user instructs the mobile terminal to record the on-sale mode identifier (Yes in Step 956*p*), then the processing proceeds to Step 956*q*. In Step 956*q*, the mobile terminal sets the on-sale mode identifier ON in the tag of the home appliance or in the server. In Step 956*r*, the mobile terminal transmits information regarding the on-sale mode identifier (identifier information) to the server, or encrypts the identifier information, a password, and a key, and transmits the encrypted information to the tag of the home appliance, so that the encrypted information is recorded on a memory region allocated in the tag. In Step 956*s*, the mobile terminal is still at the on-sale mode.

In Step 956*t*, the tag of the home appliance performs authentication by using the received password and key as well as a key stored in the tag. In Step 956*u*, the tag determines whether or not the authentication is successful (OK). If the determination in Step 956*u* is Yes, then the processing proceeds to Step 956*v*. In Step 956*v*, a value representing ON is recorded on the memory region for the on-sale mode identifier in the tag.

Otherwise (No in Step 956*u*), then the processing proceeds to Step 956*w* and is terminated.

If the determination in Step 956*p* is No, then the processing proceeds to Step 956*s*.

This can produce the following advantages. For example, it is possible to prevent a malicious consumer from changing an on-sale mode of a home appliance displayed in a store without authorization. It is also possible to prevent a malicious consumer from setting an on-sale mode of a home appliance to be OFF and performing user registration for the home appliance which the consumer has not yet purchased. Even if there is no such a non-sale mode, it is possible to prevent that a mobile terminal of a malicious consumer requests the malicious consumer to enter a password of a store or a manufacturer of a home appliance displayed in the store, and that the malicious user performs user registration for the home appliance which the malicious consumer has not purchased.

It should be noted that it has been described that the mobile terminal is switched to be at the on-sale mode in Step 956*m*. However, it is also possible that the mobile terminal performs user registration in Step 956*m*. As a result, it is possible to prevent malicious user registration for home appliances not yet been purchased, and also possible to permit sales people in an electronics retail store to perform user registration instead of a purchaser of a target home appliance.

FIG. 292 shows attributes of pieces of information recorded on the tag described in Embodiments 23, 34, 25, and so on.

[Embodiment 25]

The following describes Embodiment 25 of the present invention. FIG. 293 shows a mobile terminal 5201 according to this embodiment. FIG. 294 shows a home appliance 5211 according to this embodiment. This embodiment provides a method of easily bringing a proximity wireless communication module of the mobile terminal 5021 and a proximity wireless communication module of the home appliance 5211 into proximity, by using a guidance function of the mobile terminal 5201 and a guidance function of the home appliance 5211 in proximity wireless communication between the mobile terminal 5201 and the home appliance 5211. The mobile terminal 5201 is assumed to be a terminal, such as a Smartphone, which has a front side most of which is occupied by a display unit. In the mobile terminal 5201, a proximity wireless communication module is assumed to be provided at the rear side. The home appliance 5211 is assumed to be a general home appliance in which a proximity wireless communication module is provided at a certain part. Furthermore, a certain mark is attached to the part. The mark may be a common sign such as a circle or a cross, or a specific sign representing the proximity wireless communication module. In addition, a mark which has been originally attached, such as a manufacturer logo or a product logo, may be used.

FIG. 295 is a diagram showing display states of a position of the proximity wireless communication module of the mobile terminal 5201 according to this embodiment of the present invention. In using proximity wireless communication, the mobile terminal 5201 according to this embodiment shows, on a display unit on the front side of the mobile terminal 5201, a position (antenna position) of the antenna unit of the proximity wireless communication module provided on the rear side of the mobile terminal 5201. The antenna position may be displayed depending on the shape of the antenna unit, or may be displayed as a common sign. Furthermore, it is possible to combine a plurality of displaying ways. Here, a kind of the display of the antenna position may be selected by the user. According to this embodiment, in comparison to the case where the mobile terminal 5201 simply has, on the rear side of the mobile terminal 5201, a display for showing a position of the proximity wireless communication module, the above method can further reduce inconvenient actions of the user for approaching the proximity wireless communication module to a certain position of the home appliance while seeing the rear side of the mobile terminal 5201.

FIG. 296 is a diagram showing display states of a position of the proximity wireless communication module of the home appliance 5211 according to this embodiment of the present invention. The home appliance 5211 according to this embodiment displays guidance in using proximity wireless communication. Normally, a position of the tag on the home appliance is indicated by a printed mark. However, when the home appliance 5211 has data to be transmitted to the mobile terminal 5201, the home appliance 5211 clearly displays the existence of the data by using LED or the like. Various kinds of the display are considered in the same manner as described for the mobile terminal 5201. However, the kinds of the display on the home appliance are basically graphics expanding from the position of the proximity wireless communication module of the home appliance. According to this embodiment, it is possible to clearly display the position of the proximity wireless communication module of the home appliance when proximity wireless communication is required, without deteriorating a simple design of white goods and the like.

FIG. 297 is a diagram showing states of proximity wireless communication between the mobile terminal 5201 and the home appliance 5211 by using their proximity wireless communication modules, according to this embodiment of the present invention. The user simply approaches the mark displayed on the display unit of the mobile terminal 5201 to the center of the graphic on the home appliance 5211, so that the proximity wireless communication module of the mobile terminal 5201 can approach to the proximity wireless communication module of the home appliance 5211. Therefore, it is considerably easy to perform proximity wireless communication within a limit of a capability of the proximity wireless communication modules. This embodiment is effective for each of the mobile terminal 5201 side and the home appliance side. However, if both of the mobile terminal 5201 and the home appliance have the function of this embodiment, further effects can be expected.

FIG. 298 is a diagram showing the situation where the proximity wireless communication display is combined with an acceleration meter and a gyro. If the graphic displayed on the home appliance is not a circle expanding from the proximity wireless communication module, the graphic is assumed to be displayed depend on an inclination of the mobile terminal 5201. Therefore, it is possible to approach the mobile terminal 5201 to the graphic displayed on the home appliance at a desired angle depending on a shape of the graphic. In general, the mobile terminal 5201 is not in a shape of a circle and a square, this embodiment is efficient to the mobile terminal 5201.

FIG. 299 is a diagram showing the situation where the proximity wireless communication display is cooperated with a camera unit (camera) on the rear side of the mobile terminal 5201. Even if the home appliance displays guidance, the guidance is hidden behind the mobile terminal 5201 and therefore the user cannot see a most part of the guidance. In order to solve the above problem, the camera unit in the mobile terminal 5201 is used to display the guidance on the mobile terminal 5201. Most of mobile terminals (mobile terminal 5201) has a camera unit on the rear side, so that this embodiment is efficient for the mobile terminals. Note that, since the camera is not necessarily located at the center of the mobile terminal 5201, correction is required at the time of display.

FIG. 300 is a diagram showing the situation where the mobile terminal 5201 is cooperated with a server 5505 to download an application program from the server 5505 to achieve this embodiment. This embodiment can be realized by downloading an application program onto the mobile terminal 5201. When an application program is to be downloaded, the mobile terminal 5201 transmits a model number of the mobile terminal 5201 to the server. Based on the model number, the server transmits an application program including a value corresponding to a coordinate position of the mobile terminal 5201. It is assumed that the server has a database holding position information of the proximity wireless communication module of each mobile terminal 5201. With the above structure, the server can cope with various kinds of mobile terminal 5201. Note that the same effects as in this embodiment can equally be achieved by pre-installation.

FIG. 301 is a functional block diagram of the mobile terminal 5201 for implementing this embodiment. A control unit of the mobile terminal 5201 obtains display coordinates of a position of the antenna unit of the mobile terminal 5201, by using a general wireless communication unit. Then, the control unit stores the obtained display coordinates into a display coordinate holding unit. When a proximity wireless communication unit of the mobile terminal 5201 attempts to start proximity wireless communication, the control unit obtains the display coordinates from the display coordinate holding unit, and also obtains a display image from an antenna position display image holding unit. As a result, the control unit displays the display image at the display coordinates on the display unit of the mobile terminal 5201. It is also possible that the control unit displays, on the display unit, also image taken by the camera unit of the mobile terminal 5201. When a proximity wireless communication antenna unit of the mobile terminal 5201 approaches to a proximity wireless communication unit of the target home appliance, proximity wireless communication starts between the mobile terminal 5201 and the home appliance.

FIG. 302 is a diagram showing how the guidance display is changed in the case where a trouble occurs in the home appliance 5211. When a trouble occurs, the home appliance displays a red warning mark. Here, the trouble refers to a state, such as breakdown, where necessity of proximity wireless communication should be immediately notified to the user. After the trouble is notified, the color of the warning mark is changed from red to blue, for example. If the trouble is not urgent, for example, if a filter is to be exchanged or a firmware is requested to be updated, the warning mark is displayed in yellow. Here, the displayed colors are not limited to the above two colors. In addition, the notification to the user may be performed by producing warning sound or the like.

FIG. 303 is a diagram showing the situation of long-time communication. If long-time communication such as firmware updating is to be performed, a remaining time period of the communication is notified to the user. The notification may be displayed on the mobile terminal 5201, or on the home appliance 5211.

FIG. 304 is a diagram of the case where the home appliance 5211 having a display screen displays guidance. The proximity wireless communication module of the home appliance 5211 is not provided at the rear side of the home appliance 5211. The proximity wireless communication module is not provided on the display screen, either. Therefore, the guidance is displayed to allow the user to recognize the proximity wireless communication module provided on a part except the display screen. The guidance display may be a cross or an arrow.

FIGS. 305 to 535 are flowcharts according to this embodiment of the present invention. If an event occurs, or if proximity wireless communication has not been performed for a predetermined time period (Step 5201*a*), then the home appliance 5211 attempts to be connected to the server. In Step 5201*b*, the home appliance 5211 determines whether or not the home appliance 5211 can be connected to the server via the Internet. If the determination in Step 5201*b* is Yes, then the home appliance 5211 transmits information to the server via the Internet (Step 5201*k*). On the other hand, if the home appliance 5211 cannot be connected to the server via the Internet, the home appliance 5211 displays (illuminates), in red color, a cross mark display whose center is positioned at the center of the antenna of the home appliance 5211, in order to connect the home appliance 5211 to the server by proximity wireless communication. In the case of general errors except trouble errors, the display is made in a different color (for example, blue). Here, the trouble errors refer to errors, such as breakdown, which do not occur in normal operation. The general errors refer to errors, such as filter exchange for air conditioners, which occur even in normal operation. If there is any information except errors to be transmitted to the server, it is possible to display something (Step 5201c). In the case of errors, a warning sound is produced (Step 5201d). In Step 5201e, the home appliance 5211 determines whether or not proximity wireless communication (touching) has not been performed for a predetermined time period since the warning sound. If the touching has not been performed for the predetermined time period (Yes in Step 5201e), the home appliance 5211 determines that the user is not near, and therefore stops the warning sound (Step 5201f). Furthermore, the home appliance 5211 makes interval of blinking of the display longer or makes the display darker (Step 5201g). The home appliance 5211 estimates using hours of the home appliance based on a user history stored in the home appliance 5211. The home appliance 5211 makes interval of the illumination blinking shorter only in the using hours (Step 5201h). Then, the home appliance 5211 determines whether or not touching by the mobile terminal of the user has been performed for a time period longer than the above predetermined time period. If the touching has not been performed for the time period (Yes in Step 5201j), then the home appliance 5211 produces the warning sound again. If the home appliance 5211 detects touching by the mobile terminal of the user (No in Step 5201j), then the home appliance 5211 starts data transfer (Step 5201l). The user notices the display or the warning sound of the home appliance 5211 (Step 5202a), and then activates an application program in the mobile terminal 5201 (Step 5202b). According to the application program, the mobile terminal 5201 displays a touch instruction mark on the display unit of the mobile terminal 5201. The touch instruction mark is a cross or a circle having the center that is positioned at a target part on the display unit. The target part on the display unit corresponds to almost the center of the NFC antenna unit provided on the rear side of the display unit (Step 5202c). The mobile terminal 5201 starts transmitting radio to the home appliance 5211 via the antenna unit (Step 5202d). At the same time, the user attempts to match the touch instruction mark on the mobile terminal 5201 to the antenna display mark on the home appliance 5211 (Step 5202e). The mobile terminal 5201 repeats polling (Step 5202g). The mobile terminal 5201 determines whether or not the communication starts within a predetermined time period (Step 5202h). If the communication starts within a predetermined time period (No in Step 5202h), then the mobile terminal 5201 reads data from the memory in the proximity wireless communication unit in the home appliance (Step 5203d in FIG. 307). On the other hand, if the communication does not start within the predetermined time period (Yes in Step 5202h), then the mobile terminal 5201 stops the polling (Step 5202j), and displays "Please match them again" (Step 5203a). Then, the user tries to perform the matching. The mobile terminal 5201 determines whether or not the mobile terminal 5201 can communicate with the home appliance 5211 after the try (Step 5203b). If the communication fails even after the try (No in Step 5203b), then the mobile terminal 5201 terminates the processing (Step 5203c). In reading data, the mobile terminal 5201 obtains, from a part of the data firstly transmitted, (a) information of a total amount of data to be read and (b) a communication speed at the home appliance 5211 side (Step 5203e). The mobile terminal 5201 calculates an error ratio based on a state of the communication (Step 5203f). In Step 5203f, the mobile terminal 5201 may transmit the error ratio to the server. The mobile terminal 5201 calculates a time period required to read data from the home appliance 5211, based on the data amount and the communication speed (Step 5203g). Then, on the display unit, the mobile terminal 5201 displays an estimated time period required to read the data (Step 5204a in FIG. 308). The mobile terminal 5201 also displays a remaining time period as a bar or circle indicator. If the communication is completed (Step 5204b), then the mobile terminal 5201 displays the fact of the communication completion (Step 5204c), and then transmits the readout data to the server (Step 5204d). As the data transfer is progressed from the home appliance 5211 to the mobile terminal 5201 (Step 5204e), the home appliance may make the display unit brighter, make the blinking of the display faster, or change the color of the display (Step 5204f). If the communication is completed (Step 5204g), the home appliance 5211 may notify the completion to the mobile terminal 5201 (Step 5204h). After the communication completion (Step 5204j), the home appliance 5211 stops the blinking of the display but keeps illuminating of the display (Step 5204k), and then turns off the illumination after a predetermined time period (Step 5204m).

The following describes FIG. 309.

In Step 5205a, on the display unit of the mobile terminal, the mobile terminal selects a reservation screen for a target home appliance. When the reservation screen is selected (Yes), the mobile terminal proceeds to Step 5205b. In Step 5205b, the user inputs a reservation start time, details of reservation processing, and a parameter of a kind of the processing, into the mobile terminal. In Step 5205c, the mobile terminal determines whether or not an operation time period is varied, for example, depending on laundry in the case of a washing machine. If the determination in Step 5205c is Yes, then the processing proceeds to Step 5205d. In Step 5205d, the mobile terminal turns a "forced synchronized operation mode" ON or OFF. Then, the processing proceeds to Step 5205e.

If the determination in Step 5205c is No, then the processing proceeds to Step 5205e.

In Step 5205e, the mobile terminal determines whether or not the mobile terminal touches a target home appliance. If the determination in Step 5205e is Yes, then the processing proceeds to Step 5205f. Otherwise (No in Step 5205e), then Step 5205e is repeated.

In Step 5205f, the mobile terminal transmits an instruction for setting a program or the like to the home appliance. In Step 5205g, the home appliance receives the instruction. In Step 5205h, to the mobile terminal, the home appliance transmits the program data including an estimated time period of processing from a start to an end.

The home appliance proceeds from Step 5205h to Step 5205i. In Step 5205i, the home appliance starts the program. In Step 5205j, the home appliance determines whether or not the enforced synchronized operation mode is ON or whether or not an operation time period is fixed. If the determination in Step 5205j is Yes, then the processing proceeds to Step 5205k. Then, synchronized operation is performed between the mobile terminal and the home appliance. In Step 5205m, for example, if the home appliance such as a washing machine completes its processing in 15 minutes although the processing generally takes 20 minutes at maximum, the home appliance is stopped until 20 minutes pass. Thereby, the home appliance can be operated completely in synchronization with the mobile terminal.

If the determination in Step 5205*j* is No, then the processing proceeds to Step 5205*n*. In Step 5205*n*, the home appliance performs operation not always in synchronization with the mobile terminal.

The processing of the mobile terminal proceeds to Step 5205*p*. In Step 5205*p*, the mobile terminal receives the program from the home appliance. In Step 5205*q*, the mobile terminal starts the program. In Step 5205*r*, the mobile terminal determines whether or not the forced synchronized operation mode is ON, or whether or not an operation time period is fixed. If the determination in Step 5205*r* is Yes, then the processing proceeds to Step 5205*s*. In Step 5205*s*, the mobile terminal displays the same data as operated in the home appliance. In Step 5205*t*, the mobile terminal displays a standby screen as shown in 5302*a* in FIG. 310, and then processing proceeds to Step 5205*u*. In Step 5205*u*, the mobile terminal displays an icon for indicating a current state of the target home appliance, such as an icon 5305, 5306, or 5307 in FIG. 278. For example, when an air conditioner (home appliance) starts a reserved operation, the mobile terminal displays an icon for indicating a start time or a remaining time period of the operation, as shown in 5306*b* in FIG. 310. If the user clicks the icon, the mobile terminal changes the screen to a menu screen for the home appliance. In this embodiment, communication is performed when the mobile terminal touches a target home appliance. However, even if the mobile terminal is not communicating with home appliances, each of the home appliances operates in synchronization with the mobile terminal according to the application program shared with the mobile terminal. Therefore, the user outside home sees the mobile terminal to check operation states of the home appliances in home, and the mobile terminal notifies the user of laundry completion and the like. As a result, the user can receive services as if the services were provided via a network.

If the determination in Step 5205*r* is No, then the processing proceeds to Step 5205*v*. In Step 5205*v*, the server causes the mobile terminal to display a time period required for processing of each of home appliances. Here, the mobile terminal displays a minimum required time period and a maximum required time period.

FIGS. 282, 283, and 284 are diagrams for complementing FIGS. 256 and 257 in Embodiment 22. By controlling phases and the like of two radio waves from two antennas 431*a* and 431*b* as in MIMO, two radio beams 433*a* and 433*b* can be emitted at different angles. One radio beam 433*b* travels in a straight line in a direction 434*c* and is directly transmitted to a transmitter/receiver 432, forming a first transmission path. The other radio beam 433*a* travels in a direction 434*a*, reflects off a wall in a direction 434*b*, and is transmitted to the transmitter/receiver 432, forming a second transmission path according to MIMO.

As is clear from the drawing, a phase difference P1 can be detected from the two received signals because the two transmission paths have different distances.

Radio waves of GHz are 10 to 20 cm in wavelength. Accordingly, when a wave number difference is counted by a wave-number counter 437 in a phase difference detection unit 436, the difference between the distances of the two transmission paths can be measured with accuracy of 10 to 20 cm.

FIG. 282 shows the case where t=t2. A substantially isosceles triangle is shaped in FIG. 282.

When t=t2, a radio beam 439 is emitted downward as shown in FIG. 283.

This being so, a phase difference P2 is determined and a distance L2 is calculated in the same manner as in FIG. 282.

Since a room size is known from map information provided from the server, a vertical length is known. A sum of vertices of two isosceles triangles can be specified, with it being possible to find a difference d2 between directions 434*b* and 434*c* by geometry calculations. A distance between the transmitter/receiver 432 and a transmitter/receiver 430 can be determined from d2 and L2. A distance between the lower wall and the transmitter/receiver 432 can be determined, too. When t=t1, a distance between the upper wall and the transmitter/receiver 432 can be determined. The terminal position or the room size can be detected according to MIMO using two antennas, by changing beam directions between when t=t1 and when t=t2.

When three antennas 431*f*, 431*g*, and 431*h* are employed as shown in FIG. 284, the terminal position or the room size can be estimated without time switching. In such a case, the use of wireless LAN MIMO produces an advantageous effect of enabling position detection while performing communication. For accurate measurement, communication is performed in a time division manner between position measurement time and wireless communication time. Hence, both communication and measurement can be achieved.

[Embodiment 26]

FIG. 311 is a diagram showing a home network environment assumed in this embodiment. FIG. 312 is a diagram showing an example of terminal information in this embodiment. FIG. 313 is a diagram for describing video passing between terminals in this embodiment.

This embodiment describes the case where video passing is performed between terminals that differ in type or performance.

Suppose a mobile AV terminal 8006 is a passing source terminal and a TV 3 (8501) is a passing destination terminal. Also suppose a corresponding video server is not a home server but an external video server 3 (8504).

As in Embodiment 8, video being viewed on the mobile AV terminal 8006 is passed to the TV 3 (8503), through communication between an RFID tag 8007 of the mobile AV terminal 8006 and an RFID tag 8502 of the TV 3. Each terminal has its terminal information registered in a registration server M1005.

As shown in FIG. 312, the terminal information includes a terminal ID 8510, a terminal type 8511, a communication device 8512, terminal performance 8513, an installed application 8514, and the like.

As shown in FIG. 313, in the case where the mobile AV terminal 8006 is receiving video from the external video server 3 (8504) by an application 2, the mobile AV terminal 8006 passes an application ID "application 2".

Moreover, in the case where the application 2 is a commercial video application and video cannot be viewed without inputting a PW, the mobile AV terminal 8006 passes an application 2 video viewing PW.

The mobile AV terminal 8006 further passes an IP address of the video server 3, a video identifier, and a video display time. The mobile AV terminal 8006 may also pass time information used in the mobile AV terminal 8006, to synchronize video passing.

A display time correction unit 8113 uses the time information, together with time information used in the TV terminal. For example, if the time used in the mobile AV terminal and the time used in the TV terminal has a difference of one second, the display time on the terminal is shifted by one second to synchronize video passing.

Upon receiving a passing request, the TV 3 (8503) inquires of the registration server whether or not the video can be passed to the TV 3. The registration server determines whether or not the application 2 is installed in the TV 3 and whether or not communication device performance and terminal performance are sufficient, and transmits these information to the TV 3. The TV 3 transmits a video passing response to the mobile AV terminal based on the received information. The TV 3 may adjust a buffering time and a display time, in consideration of a communication device delay, a terminal display delay, and the like in the registration server.

[Embodiments A and B]

A mobile communication device that can facilitate setting in a home network is described in the following embodiments.

In these embodiments, a device that enables, by a simple operation, transmission of predetermined transmission information to a predetermined server when an appliance such as a home appliance is installed in a home (see a home 99 in FIG. 478) is included in the scope of the present invention.

Moreover, in these embodiments, a device that can, as a result of the above simple operation, simplify an operation when a wireless LAN access point (see an access point 99*c* in FIG. 478) or the like performs suitable wireless communication corresponding to an installation position, from among first wireless communication in a first mode (e.g. wireless communication with relatively low power) and second wireless communication in a second mode (wireless communication with relatively high power) is included in the scope of the present invention.

The following describes a communication device according to embodiments of the present invention in detail, with reference to drawings.

The following describes Embodiments A (A1 to A13) and B (B1 to B7).

Various aspects of a communication device according to the present invention are described in the following embodiments (Embodiments A and B).

For example, Embodiment B4 may be understood first.

Moreover, Embodiment B (B1 to B7) may be understood prior to Embodiment A (A1 to A13).

Drawings closely related to Embodiment B4 are, for example, FIGS. 444 to 461 (and FIGS. 478 to 490). Hence, FIGS. 444 to 461 (and FIGS. 478 to 490) may be understood first.

Drawings closely related to Embodiment B (B1 to B7) are, for example, FIGS. 427 to 490. Hence, FIGS. 427 to 490 may be understood prior to FIGS. 1 to 426.

Of FIGS. 427 to 490 relating to Embodiment B noted above, it is also preferable to understand, for example, FIGS. 478 to 490 prior to other drawings.

In other words, see FIGS. 478 to 490 for understanding of the above-mentioned matter of significance at the time of filing.

That is, for example, the following mobile communication device is disclosed.

The mobile communication device may include: an appliance information obtainment unit (an appliance information obtainment unit 98*n*) that obtains, from an appliance (e.g. an appliance 98*a* in FIG. 480 (such as a TV N10A in FIG. 478)) installed at a predetermined position (e.g. the home 99 (inside the home 99) in FIG. 478), appliance information (appliance information 98*n*1) by proximity wireless communication (proximity wireless communication 98*c*1, communication according to NFC) between the installed appliance and the mobile communication device (e.g. a mobile communication device 98*b*), the appliance information specifying the appliance (the first appliance 98*a*) from among a plurality of appliances (e.g. the first appliance 98*a* and a second appliance 98*r* in FIG. 480); a position information obtainment unit (a position information obtainment unit 98*j*) that obtains position information (position information 98*j*1) indicating a position (a position of the appliance 98*a*, a position of the TV N10A) of the mobile communication device when the proximity wireless communication is performed between the installed appliance and the mobile communication device (as a result of, for example, a movement 98*b*1 of the mobile communication device 98*b* to touch the appliance 98*a*) (i.e. the proximity wireless communication is performed where the position of the installed appliance (the appliance 98*a* (the TV N10A)) is the same position as the position of the mobile communication device); and a transmission unit (a transmission unit 98*o*) that transmits transmission information (transmission information 98*o*1) to a predetermined server (a server 98*c*, e.g. a server of a manufacturer of the appliance 98*a* situated outside the home 99 and connected to a communication line 99*b* in FIG. 478) in the case where the proximity wireless communication is performed, the transmission information including the appliance information (the appliance information 98*n*1) obtained by the proximity wireless communication and the obtained position information (the position information 98*j*1) (at the same position (the position of the TV N10A)).

Moreover, the mobile communication device may further include a detection unit (a communication detection unit 98*q* in FIG. 490) that detects that the proximity wireless communication (the proximity wireless communication 98*c*1) is performed between the installed appliance and the mobile communication device (upon a touching operation or the like), the proximity wireless communication being performed in the case where the appliance (the appliance 98*a*) is installed at the predetermined position (the home 99), wherein the transmission unit transmits the transmission information (the transmission information 98*o*1) to the predetermined server in the case where the detection unit detects that the proximity wireless communication is performed, the transmission information being required to be transmitted to (e.g. registered in) the server in the case where the appliance is installed at the predetermined position, the transmitted transmission information includes the appliance information (the appliance information 98*n*1) specifying the installed appliance from among the plurality of appliances, the appliance information obtainment unit obtains the appliance information from the appliance by the proximity wireless communication, the transmitted transmission information includes position information (the position information 98*j*1) indicating the position at which the appliance is installed, and the position information obtainment unit obtains, as the position information indicating the position of the appliance, the position information (the position information 98*j*1) indicating the position of the mobile communication device (the mobile communication device 98*b*) when the proximity wireless communication is performed between the installed appliance and the mobile communication device.

According to this structure, the transmission information 98*o*1 including the appliance information 98*n*1 and the position information 98*j*1, which needs to be transmitted to the server 98*c* (e.g. the server of the manufacturer of the appliance 98*a*) in the case where the appliance 98*a* is installed in the home 99, can be transmitted by a simple operation such as a touching operation to initiate the proximity wireless communication 98*c*1.

Besides, the device that performs the proximity wireless communication 98*c*1 is the mobile communication device 98*b* such as a mobile phone, with there being no need to add a new structure to perform the proximity wireless communication 98*c*1. This contributes to a lower cost.

In addition, the device is the mobile communication device 98*b*, with there being no need to add a new structure to obtain the position information. This contributes to a sufficiently lower cost. That is, an extent of cost reduction can be increased.

In detail, there is no need to add a new structure such as a GPS device to the installed appliance 98*a*.

Hence, a simple operation, a lower cost, and an increased extent of cost reduction can all be achieved.

Note that, for instance, the appliance (the appliance 98*a*) is a home appliance (e.g. the TV N10A or a FF heater N10K in FIG. 478) in the home (the home 99), and the mobile communication device is a mobile phone of a resident of the home in which the appliance is installed, a smartphone of the resident with a mobile phone function, or the like.

Moreover, the obtained position information (the position information 98*j*1) may specify a movement (a movement 96*e* in FIG. 485) of the mobile communication device from a base point (a base point 98*bx* in FIG. 485, the access point 99*c* in FIG. 478) to the position at which the appliance (e.g. a first appliance 96*c*, a second appliance 96*d* (the FF heater N10K, the TV N10A in FIG. 478)) is installed, to indicate a first position (a first position 96*c*P in FIG. 485, the position of the FF heater N10K in FIG. 478) in the case where the specified movement (the movement 96*e*) is a first movement to the first position, and a second position (a second position 96*d*P, the position of the TV N10A) in the case where the specified movement is a second movement to the second position (the second position 96*d*P), wherein the server (the server 98*c* in FIG. 485 (e.g. a server (home server) 99*a* in FIG. 478)) to which the transmission information is transmitted performs control so that wireless communication in a first mode (low-power wireless communication 96*f*1) is performed between a predetermined wireless communication device (a processor 96*a*, the access point 99*c* in FIG. 478) and the installed appliance in the case where the movement (the movement 96*e*) specified by the position information in the transmission information is the first movement, and wireless communication in a second mode (high-power wireless communication 96*f*2) is performed between the predetermined wireless communication device and the installed appliance in the case where the specified movement is the second movement.

Thus, wireless communication in a suitable mode (the wireless communication 96*f*1, 96*f*2) corresponding to the position (the first position 96*c*P, the second position 96*d*P) at which the appliance 98*a* is installed in the home 99 may be performed by transmitting the transmission information 98*o*1 as described above.

According to this structure, a very complex operation required to perform suitable wireless communication, such as an operation of wireless communication power setting, becomes unnecessary, as a simple operation such as a touching operation of the mobile communication device 98*b* is sufficient. Thus, a significantly simplified operation can be realized.

Moreover, the position information obtainment unit may include an acceleration sensor (an acceleration sensor 98*j*2*x* in FIG. 488) that detects an acceleration when the mobile communication device moves (the movement 96*e* in FIG. 485) to the position at which the appliance is installed (from the base point (the base point 98*bx* in FIG. 485, the access point 99*c* in FIG. 478)), wherein the obtained position information (the position information 98*j*1) specifies the movement (the movement 96*e*) according to the detected acceleration, to indicate the position (the position of the appliance 98*a* (e.g. the first appliance 96*c* in FIG. 485)) of the mobile communication device after the specified movement (the movement 96*e*), as the position at which the appliance is installed.

According to this structure, for example even in the case where a GPS field intensity is not adequate to obtain position information of sufficiently high accuracy, appropriate position information can be obtained merely by using the acceleration sensor. This ensures appropriate processing.

Moreover, the predetermined position at which the appliance is installed is inside a home, wherein the proximity wireless communication (the proximity wireless communication 98*c*1 in FIG. 480) is communication according to Near Field Communication (NFC) performed when, in the case where the appliance is installed in the home, a user of the mobile communication device in the home in which the appliance is installed performs an operation (98*b*1 in FIG. 480) of touching the mobile communication device to the installed appliance.

The mobile communication device may also be implemented, for example, as described in "Other Variations" or in Embodiments A and B. The description of "Other Variations" appears at the end of this section, i.e., "Description of Embodiments", and should be referenced when necessary.

The technical field of Embodiments A (A1 to A13) and B (B1 to B7) described below is a relatively new field with various possibilities, where it is relatively difficult to predict what kinds of technologies will be widely available in the future.

In view of this, the following describes a relatively wide variety of technologies (e.g. Embodiments A1 to A13, B1 to B7).

Here, the drawings should be referenced as follows.

See, for example, FIGS. 1 to 470 for understanding of Embodiment A.

See, for example, FIGS. 427 to 490 (FIGS. 427 to 477 and 478 to 490) for understanding of Embodiment B.

See, for example, FIGS. 1 to 39 for Embodiment A1, FIGS. 40 to 47 for Embodiment A2, FIGS. 48 to 58 for Embodiment A3, FIGS. 372 to 375 for Embodiment A4, FIGS. 376 to 383 for Embodiment A5, FIGS. 384 to 389 for Embodiment A6, FIGS. 390 to 400 for Embodiment A7, FIGS. 401 to 415 for Embodiment A8, FIGS. 416 to 417 for Embodiment A9, FIG. 418 for Embodiment A10, FIG. 419 for Embodiment A11, FIGS. 420 to 424 for Embodiment A12, and FIGS. 425 to 426 for Embodiment A13.

See, for example, FIGS. 427 to 432 for Embodiment B1, FIGS. 433 to 439 for Embodiment B2, FIGS. 440 to 443 for Embodiment B3, FIGS. 444 to 461 for Embodiment B4, FIGS. 462 to 470 for Embodiment B5, FIGS. 471 to 476 for Embodiment B6, and FIGS. 477 to 477 for Embodiment B7.

Here, the whole drawing including FIGS. 353A, 353B, and 353C (e.g. each of FIGS. 353A, 353B, and 353C) is referred to as "FIG. 353" when necessary. The same applies to FIGS. 353A to 353D and the like.

For example, each apparatus (device) (Embodiments A (A1 to A13) and B (B1 to B7), other variations) may be implemented as follows. The components of the apparatus may typically be realized by Large Scale Integration (LSI) as an integrated circuit. The components may each be implemented individually as one chip, or may be partly or wholly implemented on one chip. The integrated circuit may be referred to as any of IC, system LSI, super LSI, ultra LSI, or the like, depending on the degree of integration. The integrated circuit according to the embodiments may be referred to as any of these terms. Moreover, the integrated circuit method is not limited to LSI, and may be realized by a dedicated circuit or a general-purpose processor. A Field Programmable Gate Array (FPGA) or a reconfigurable processor capable of reconfiguring connections and settings of circuit cells in an LSI circuit may also be used.

Furthermore, if an integrated circuit technology that replaces the current semiconductor technology emerges from advancement of semiconductor technologies or other derivative technologies, such a technology can be used for the functional block integration. For instance, biotechnology may be adapted in this way.

[Embodiment A]

A communication device according to Embodiment A (Embodiments A1 to A13) may be a subordinate conception of the following communication device X (e.g. FIGS. 445, 448, 428, 116, 440).

The communication device X is a communication device (e.g. a mobile device N20 in FIGS. 448 and 445, a communication device Y02 in FIG. 440, a communication device M1101 in FIGS. 428 and 116, a communication device M1101S or M1101R in FIG. 433) that reads terminal device information from a terminal device (e.g. the TV N10A in FIGS. 447 and 448, a terminal device Y01 in FIG. 440) by proximity wireless communication (RF tag communication), and transmits the read terminal device information to a server apparatus (a registration server N40 in FIGS. 448 and 446, a server Y04 in FIG. 440) via a general-purpose network (a home network N100 or an external network N101 in FIG. 448). In detail, the communication device X includes: a terminal device information obtainment unit (a RF-ID reader/writer N21 in FIGS. 448 and 445, a device UID obtainment unit M1202 in FIG. 429) that obtains the terminal device information (information in a memory N13 in FIG. 444, product information in (a) in FIG. 450, information in a ROM Y015 in FIG. 440) from the terminal device (e.g. the TV N10A in FIG. 447) by the proximity wireless communication, the terminal device information including at least terminal device identification information for identifying manufacturing information of the terminal device; a communication device information storage unit (e.g. a memory unit N25 in FIG. 445, a ROM Y025 in FIG. 440) that stores communication device information including at least communication device identification information (information in the memory unit N25 in FIG. 445, a product serial number stored in the ROM Y025 in FIG. 440) for identifying manufacturing information of the communication device; an information adding unit (a CPU N34 in FIG. 445, a registration information generation unit M1204 in FIG. 429, an information adding unit Y035 in FIG. 440) that adds the stored communication device information to the obtained terminal device information, to generate transmission information (e.g. server registration information in (b) in FIG. 450) to be transmitted to the server apparatus, the transmission information (information including both the terminal device information and the communication device information) being obtained by adding the communication device information to the terminal device information; and a communication unit (a communication unit N30 in FIG. 445, a registration information transmitting/receiving unit M1207 in FIG. 420, a communication unit Y036 in FIG. 440) that transmits the transmission information generated by the information adding unit to the server apparatus via the general-purpose network. The communication unit specifies, as the server to which the transmission information is to be transmitted, the server (e.g. the registration server N40 in FIG. 448) indicated by the terminal device information based on the terminal device information (e.g. "address of registration server" in the product information in (a) in FIG. 450) obtained from the terminal device (the TV N10A in FIG. 447), and communicates with the specified server.

Here, the communication device X may further include a position information obtainment unit (a GPS N31 or a 6-axis sensor N32 in FIG. 445, a position information obtainment unit M1206 in FIG. 429, a position information determination unit Y027 in FIG. 440) that obtains position information of the communication device. The position information obtainment unit may obtain the position information of the communication device at a timing when the proximity wireless communication between the terminal device (e.g. the TV N10A in FIG. 447) and the communication device is established in the terminal device information obtainment unit, wherein the communication device information includes the position information of the communication device obtained by the position information obtainment unit.

Moreover, the communication device information may include identification information (home ID) of a home (the home in FIG. 447) or a person (the user of the communication device).

The communication device X may have the following structure.

The communication device X is a mobile terminal that is included in a HEMS (a system in FIGS. 447 and 448) and carried by the user, thus having the same position as the user.

Of the case where a distance between the terminal device (e.g. the TV N10A in FIG. 447) and the communication device is a proximate distance less than a threshold and the case where the distance is a far distance not less than the threshold, the terminal device information obtainment unit performs the proximity wireless communication with the terminal device only in the case of the proximate distance.

The communication unit causes the server apparatus to perform processing (e.g. control of the terminal device) for the terminal device (the TV N10A in FIG. 447) with which the proximity wireless communication is performed, from among a plurality of terminal devices (e.g. a plurality of terminal devices in FIG. 447, or a plurality of terminal devices including a terminal device in a home other than the home in FIG. 447).

According to this structure, from among the terminal device (e.g. the TV N10A in FIG. 447) into proximity of which the communication device is moved and other terminal devices (e.g. a terminal device in another home), control or the like is easily performed only for the terminal device in the proximate distance, and not for the other terminal devices. Thus, control or the like is performed only for an appropriate terminal device. This ensures that processing is performed only for an appropriate terminal device.

Such control or the like only for an appropriate terminal device can be achieved simply by moving the communication device into proximity of the terminal device, without requiring a complex operation. Hence, it is possible to easily perform appropriate processing, i.e., processing only for an appropriate terminal device.

The terminal device information obtainment unit also obtains, from the terminal device (e.g. the TV N10A in FIG. 447), the terminal device information for specifying the server apparatus from among a plurality of server apparatuses, by the proximity wireless communication.

The communication unit then causes the server apparatus specified by the terminal device information obtained by the terminal device information obtainment unit, to perform the above-mentioned processing such as control.

This ensures that processing by an appropriate server apparatus is performed regardless of any factor outside the terminal device (the TV N10A).

The communication device further includes a home ID transmission unit (a home ID management unit M1205 in FIG. 429) that specifies the home (the home in FIG. 447) in which the communication device is used from among a plurality of homes, and transmits, to the server apparatus, a home ID for specifying each appliance (appliances in FIG. 447) installed in the home (the home in FIG. 447) specified by the home ID from among a plurality of appliances (the appliances in the home in FIG. 447, appliances in another home), to cause the server apparatus to specify that the terminal device (the TV N10A) with which the proximity wireless communication is performed is included in the appliances installed in the home.

For example, the home ID may be transmitted to the server apparatus via a predetermined communication unit (e.g. the registration information transmitting/receiving unit M1207 in FIG. 429) that transmits the home ID.

The home ID transmission unit may cause the server apparatus to specify that the terminal device (the TV N10A) is included in the appliances installed in the home, to thereby cause the server apparatus to specify a map (a product map in FIG. 457) in which the terminal device (the TV N10A) is included in products whose positions are indicated to the user, as a product map (the product map in FIG. 457).

The home ID transmission unit may also cause the server apparatus to specify that the terminal device (the TV N10A) is included in the appliances (the appliances in FIG. 447), to thereby cause the server apparatus to perform, on the terminal device (the TV N10A), processing (e.g. processing of powering ON an appliance nearest the user) to be performed for each of the appliances.

The communication device further includes the position information obtainment unit (mentioned above) that obtains a position of the terminal device (the TV N10A) with which the proximity wireless communication is performed, and causes the server apparatus to specify the obtained position as the position of the terminal device, where the position of the terminal device is the same position as the communication device.

According to this structure, merely by moving the communication device to an appropriate position (the position of the TV N10A), it is possible to easily cause the server apparatus to perform processing in accordance with the position of the terminal device (the TV N10A).

The communication device Y02 in FIG. 440 may be a subordinate conception (a specific example) of the communication device X.

[Embodiment A1]

Embodiment A1 is described below.

FIG. 314 is a schematic diagram of Embodiment A1.

Here, a communication system including an image capturing device (camera) 1 (a communication device 9A1), a TV 45, and a server (image server) 42 is illustrated. In FIG. 1, the image capturing device 1 capturing images is illustrated on a left-hand side, while the image capturing device 1 reproducing the captured images is illustrated on a right-hand side.

The image capturing device 1 is an example of the communication device according to the aspect of the present invention. Here, the image capturing device 1 is implemented as a digital camera.

For units used in capturing images (see the left-hand side in FIG. 314), the image capturing device 1 includes a first power supply unit 101, a video processing unit 31, a second antenna 20, a first processing unit 35, a second memory 52, and a RF-ID antenna 21. The second memory 52 holds medium identification information 111, captured image state information 60, and server specific information 48. The RF-ID antenna 21 is used for a RF-ID unit.

For units used in reproducing images (see the right-hand side in FIG. 314), the image capturing device 1 includes the first power supply unit 101, a first memory 174, a power detection unit 172, an activation unit 170, the second memory 52, a second processing unit 95, a modulation switch unit 179, a communication unit 171, a second power supply unit 91, and the RF-ID antenna 21. The second memory 52 holds medium identification information 111, captured image state information 60, and the server specific information 58.

The TV 45 is an example of an apparatus (device) connected with a reader via a communication path. In more detail, the TV 45 is a television receiving apparatus used to display image data captured by the image capturing device 1. The TV 45 includes a display unit 110 and a RF-ID reader/writer 46.

The server 42 is a computer that holds image data uploaded from the image capturing device 1 to the server 42 and that downloads the image data to the TV 45. The server 42 has a storage device in which data (image data) 50 is stored.

When images of objects such as scenery are captured by the image capturing device 1, the images are converted to captured data (image data) by the video processing unit 31. Then, in communicable conditions, the image data is wirelessly transmitted to an access point using the second antenna 20 for a wireless Local Area Network (LAN) or Worldwide Interoperability for Microwave Access (WiMAX), and eventually recorded as the data 50 via, for example, the Internet to the predetermined server 42.

Here, the first processing unit 35 records the captured image state information 60 regarding the captured image data onto the second memory 52 in a RF-ID unit 47 in the image capturing device 1. The captured image state information 60 recorded by the first processing unit 35 or the like indicates at least one of (a) date and time of capturing each of the images, (b) the number of the captured images, (c) date and time of finally transmitting (uploading) an image, (d) the number of transmitted (uploaded) images, and (e) date and time of finally capturing an image. In addition, the captured image state information 60 includes (f) serial numbers of images that have already been uploaded or images that have not yet been uploaded; (g) a serial number of a finally captured image; and the like.

In addition, the first processing unit 35 generates a Uniform Resource Locator (URL) of the data 50 that is uploaded to the server 42. The first processing unit 35 records the server specific information 48 (URL) onto the second memory 52. The server specific information 48 is used to access the image data (the data 50 in FIG. 314). The medium identification information 111 is also recorded on the second memory 52. The medium identification information 111 is used to determine whether the device embedded with the RF-ID (RF-ID unit 47) is a camera, a card, or a post card.

When a main power (the first power supply unit 101 such as a battery) of the camera (the image capturing device 1) is ON, the second memory 52 receives power from the main power. Even if the main power of the camera is OFF, the external RF-ID reader/writer located outside supplies power to the RF-ID antenna 21 of the RF-ID unit 47. This enables the passive second power supply unit 91 without any power like a battery to adjust a voltage to provide power to respective units in a RF-ID circuit unit including the second memory 52. Thereby, it is possible to supply power to the second memory 52 so that the data in the second memory 52 is recorded/reproduced and transmitted/received by the image capturing device 1.

Here, the second power supply unit 91 is a circuit generating power from radio waves received by the second antenna 21. The second power supply unit 91 includes a rectifier circuit and the like. Whenever the main power is ON or OFF, the data in the second memory 52 is read and written by the second processing unit 95. When the main power is ON, the data in the second memory 52 can be read and written also by the first processing unit 35. In other words, the second memory 52 is implemented as a nonvolatile memory, and both the first processing unit 35 and the second processing unit 95 can read and write data from and to the second memory 52.

When the image capturing device 1 completes capturing images of a trip or the like and then the captured images are to be reproduced, the following processing is performed as illustrated on the right side of FIG. 314 as being the situation of reproducing images. The image capturing device 1 is moved into proximity of the RF-ID reader/writer 46 of the TV 45, by the user of the image capturing device 1 or the like. Then, the RF-ID reader/writer 46 supplies power to the RF-ID unit 47 via the antenna 21. Based on the supplied power, the second power supply unit 91 provides power to the units in the RF-ID unit 47, even if the main power (the first power supply unit 101) of the image capturing device 1 is OFF.

The captured image state information 60 and the server specific information 58 are read by the second processing unit 95 from the second memory 52, and transmitted to the TV 45 via the antenna 21 by the second processing unit 95 or the like.

The TV 45 generates a URL based on the server specific information 58, then downloads the image data of the data 50 from the server 42 specified by the URL, and eventually displays, on the display unit 110, thumbnails or the like of images in the image data.

If it is determined based on the captured image state information 60 that there is any captured image not yet uploaded to the server 42, the determination result is displayed on the display unit 110. If necessary, the image capturing device 1 is activated to upload, to the server 42, image data of the captured image not yet uploaded.

FIG. 315 is an external view of the image capturing device 1.

(a), (b), and (c) in FIG. 315 are an external front view, an external back view, and an external right side view, respectively, of the image capturing device 1 according to this embodiment.

As illustrated in (c) in FIG. 315, the antenna 20 used for a wireless LAN and the antenna 21 used for the RF-ID unit are embedded in a right side of the image capturing device 1. The antennas are covered with an antenna cover 22 made of a material not shielding radio waves.

The RF-ID unit operates at a frequency of 13.5 MHz, while the wireless LAN operates at a frequency of 2.5 GHz. The significant difference in frequency prevents interference between them.

Therefore, the two antennas 20 and 21 are seen overlapping with each other from the outside, as illustrated in (c) in FIG. 315. The structure decreases an installation area of the antennas, eventually reducing a size of the image capturing device 1.

The structure also enables the single antenna cover 22 to cover both of the two antennas as illustrated in (c) in FIG. 315, so that the part made of the material not shielding radio waves is minimized. The material not shielding radio waves, such as plastic, has a strength lower than that of a metal. Therefore, the minimization of the material can reduce a decrease in a strength of a body of the image capturing device 1. The image capturing device 1 further includes a lens 6 and a power switch 3. The units assigned with reference signs 2 to 16 will be described later.

FIG. 316 is a detailed block diagram of the image capturing device 1.

Image data captured by an image capturing unit 30 is provided to a recording/reproducing unit 32 via the video processing unit 31 and then recorded onto a third memory 33. The image data is eventually recorded onto an Integrated Circuit (IC) card 34 that is removable from the image capturing device 1.

The above processing is instructed by the first processing unit 35 that is, for example, a Central Processing Unit (CPU). The image data, such as captured photographs or video, is provided to an encryption unit 36, a transmission unit 38 in a communication unit 37, and then the first antenna 20, in order to be transmitted to an access point or the like by radio via a wireless LAN, WiMAX, or the like. From the access point or the like, the image data is transmitted to the server 42 via the Internet 40. In the above manner, the image data such as photographs is uploaded.

There is a situation where a part of the image data fails to be uploaded because, for example, the communication state is not good or there is no nearby access point or base station. In the situation, some images have already been uploaded to the server 42, and the other images have not yet been uploaded.

Therefore, the image data in the server 42 is different from the image data captured by the image capturing device 1.

In Embodiment A1 of the present invention, the RF-ID reader/writer 46 of the TV 45 or the like reads the server specific information 48 and the like from the second memory 52 in the RF-ID unit 47 of the image capturing device 1. Then, based on the readout information, a URL or the like of the server 42 is generated. According to the URL, the TV 45 accesses the server 42 to access the data 50 such as a file, folder, or the like uploaded by the image capturing device 1. Then, the TV 45 downloads the uploaded images from among the images captured by the image capturing device 1, and displays the downloaded images. The above method will be described in more detail later.

If a part or all of the captured images is not uploaded as image data of the data 50 in the server 42, a problem would occur that a user downloading the images to the TV 45 cannot watch a part of the images on the TV 45.

In order to solve the problem, in Embodiment A1 of the present invention, the first processing unit 35 causes a recording/reproducing unit 51 to indicate information regarding a state of captured images, such as information of uploading state, to the captured image state information 55 in the second memory 52.

FIG. 317 is a block diagram of the second memory 52.

The above is described in more detail with reference to FIG. 317.

In the second memory 52, synchronization information 56 (FIG. 317) is recorded. The synchronization information 56 indicates whether or not image data in the server 42 matches image data captured by the camera, in other words, whether or not the image data in the server 42 is in synchronization with the image data captured by the camera.

In Embodiment A1 of the present invention, the TV 45 reads the captured image state information 55 from the second memory 52 via the second antenna 21.

The captured image state information 55 makes it possible to instantly determine whether or not the data 50 in the server lacks any image.

If the determination is made that there is any image that has not yet been uploaded, then the determination result is displayed on the display unit of the TV 45. Here, the TV 45 also displays a message of "Please upload images" to a viewer. Or, the TV 45 issues an instruction to the camera via the RF-ID antenna 21 to transmit an activation signal to the activation unit 170, thereby supplying power to the first power supply unit 101 of the image capturing device 1. Thereby, the TV 45 causes the image capturing device 1 to upload, to the server 42, the images in the first memory 174 or the like of the image capturing device 1, which have not yet been uploaded, via a wireless LAN, a wired LAN, the RF-ID antenna 21, or the like.

Since transmission via the RF-ID antenna 21 has a small transfer amount, transmission of the image data as originally captured takes a considerable time to upload and display the image data. This causes a user to feel unpleasant.

In order to avoid this, according to Embodiment A1 of the present invention, when the image data is transmitted via the RF-ID antenna 21, thumbnails of the images not yet uploaded are transmitted instead.

The thumbnails can shorten apparent upload time and display time, suppressing unpleasant feeling of the user.

Most of current RF-ID of a HF band has a transfer amount of several hundreds kbps. However, development of RF-ID having a quad-speed has been examined. The quad-speed RF-ID has a possibility of achieving a transfer amount of several Mbps. If thumbnails of images not yet uploaded are transmitted, it is possible to transmit several dozens of thumbnails in one second. If thumbnails are displayed in a list, thumbnails of all images including images not yet uploaded can be displayed on the TV within a time period a general user can tolerate. The above is one of practical solutions.

If the image capturing device is forced to be activated to upload images not yet uploaded as described above, the most speedy and stable path is selected from a wireless LAN, the RF-ID antenna 21, and a wired LAN, to be used for uploading and displaying on the TV.

In the situation where the image capturing device 1 receives power from the outside via the second antenna 21, the communication unit 171 transmitting signals to the second antenna performs communication with the outside by a low-speed modulation method. On the other hand, in the situation where the image capturing device 1 can receive power from the first power supply unit 101 or the like, the communication unit 171 switches the modulation method to a modulation method having a large signal point, such as Quadrature Phase Shift Keying (QPSK), 16-Quadrature Amplitude Modulation (QAN), or 64-QAN, as needed, in order to achieve high-speed transfer to upload the image data not yet uploaded in a short time.

Furthermore, when the power detection unit 172 detects, for example, that the first power supply unit 101 or the like does not have enough power or that the image capturing device 1 is not connected to an external power, the first power supply unit 101 stops supplying power and the modulation switch unit 175 switches the modulation method employed by the communication unit 171 to a modulation method having a smaller signal point or less transfer rate. As a result, it is possible to prevent that the capacity of the first power supply unit 101 is reduced to be equal to or less than a set value.

There is another solution for power. When power is not enough, the second processing unit 95, the communication unit 171, or the like sends a power increase request signal to the RF-ID reader/writer 46 of the TV 45 via the second antenna 21, to request for power support. In response to the request, the RF-ID reader/writer 46 increases providing power to have a value greater than the set value for the power used in reading data from the RF-ID unit. Since the RF-ID unit receives more power via the antenna 21, the RF-ID unit can provide power to the communication unit 171 or the first processing unit 35. Thereby, a power amount of a battery 100 for the first power supply unit 101 is not reduced. Or, without the battery 100, the image capturing device 1 can practically and unlimitedly continue transmission.

As still another method, uploaded-image-data information 60 in FIG. 316 can be used. In uploaded-image-data information 60, uploaded-image information 61 such as serial numbers of photographs, is recorded. It is also possible to use hashed information 62 generated by hashing the information 61. As a result, a data amount is reduced.

The TV 45 can read the above information to be compared to information of images captured by the camera, thereby obtaining information of images not yet uploaded.

As still another method, not-yet-uploaded image data existence identification information 63 can be used. The not-yet-uploaded image data existence identification information 63 includes an existence identifier 64 indicating whether or not there is any image not yet uploaded. Since existence of images not yet uploaded is notified, data in the second memory 52 can be significantly reduced.

It is also possible to use not-yet-uploaded-image number 65 indicating the number of images not yet uploaded. Since the image capturing device 1 allows the TV 45 to read the information, a viewer can be informed of the number of images to be uploaded. In this case, a data capacity in addition to the number is recorded as the captured image state information 55. Thereby, the image capturing device 1 enables the TV 45 to display a more exact prediction time required to upload images not yet uploaded.

It is also possible to use not-yet-uploaded image information hashed information 67 that is generated by hashing information regarding images not yet uploaded.

In addition, it is also possible to record a final capturing time (final capturing date/time) 68 in the second memory 52. Later, the TV 45 reads the final capturing time 68. The TV 45 is connected to the server 42 to compare the final capturing time 68 to a capturing date of an image that has been finally uploaded to the server 42. Thereby, it is possible to easily determine whether or not there is any image not yet uploaded.

If images are captured and assigned with serial numbers sequentially from an older image, it is possible to record only a final image serial number 69. The final image serial number 69 is compared to a serial number of an image that has been finally uploaded to the server 42. Thereby, it is possible to determine whether or not there is any image not yet uploaded.

It is also possible to record, onto the second memory 52, captured image information 70 (e.g. serial numbers of all captured images). Thereby, the TV 45 later accesses the server 42 to match the serial numbers to images uploaded to the server 42. As a result, it is possible to determine whether or not there is any image not yet uploaded. When the captured image information 70 is used, use of hashed information 71 generated by hashing the captured image information 70 can compress the captured image information 70.

The second memory 52 further stores Unique IDentification (UID) 75 of the RF-ID unit, camera ID 76, and the medium identification information 111. Even if the main power of the camera (except a sub-power for backup etc. of a clock) is OFF, these pieces of information can be read by the TV 45 via the second antenna 21 to be used for identifying the camera or the user or authenticating a device (apparatus). When the user comes back from an overseas trip or the like, the camera is likely to have a small charge amount of the battery. However, according to Embodiment A1 of the present invention, the camera can be operated to transmit information without battery, which is highly convenient for the user. The medium identification information 111 includes an identifier or the like indicating whether the medium or device embedded with the RF-ID unit is a camera, a camcorder, a post card, a card, or a mobile phone. The identifier enables the TV 45 to identify the medium or device. Thereby, the TV 45 can display a mark or icon of the camera or postcard on a screen as illustrated in FIG. 335, as will be described. The TV 45 can also change processing depending on the identifier.

FIG. 318 is a block diagram of the second memory in the image capturing device according to Embodiment A1.

The second memory 52 also stores image display method instruction information 77. For example, in the situation where a list display 78 (information of whether or not to perform list display) in FIG. 318 is selected, when the second antenna 21 is moved into proximity of the RF-ID reader/writer 46 of the TV 45, the image capturing device 1 (camera) causes the TV 45 to display a list of thumbnails of images, such as photographs.

In the situation where slide show 79 is selected, the image capturing device 1 causes the TV 45 to sequentially display images from a newer one or an older one.

In a lower part of the second memory 52 in FIG. 318, there is a region for recording the server specific information 48.

The server specific information 48 allows a camera operator to display images on the TV screen by a preferred method.

The server specific information 48 includes server URL generation information 80 that is source information from which a server URL is generated.

An example of the server URL generation information 80 is login ID 83. The server specific information 48 has a region in which server address information 81 and user identification information 82 are recorded. In practical, login ID 83 and the like are recorded. In addition, there is a region for storing a password 84. An encrypted password 85 may be stored in the region. The above pieces of information are used to generate a URL by a URL generation unit 90 that is provided in the image capturing device 1, the RF-ID unit 47, the camera function used for capturing images in the image capturing device 1, or the TV 45. The URL is used for accessing a group of images corresponding to the image capturing device 1 or the user in the server 42. If the URL generation unit 90 (FIG. 318) is provided in the RF-ID unit 47, the URL generation unit 90 receives power from the second power supply unit 91.

It is also possible to generate URL 92 without using the above pieces of information and store the generated URL 92 directly to the second memory 52.

It is characterized in that the above-described pieces of information stored in the second memory 52 can be read by both the second processing unit 95 in the RF-ID unit and the first processing unit 35 in the camera function.

The above structure allows the TV 45 reading the RF-ID unit 47 in the camera to instantly obtain the pieces of information regarding uploading state, the sever address information, the login ID, the password, and the like. Thereby, the TV 45 can download image data corresponding to the camera from the server 42, and display the image data at a high speed.

In the above situation, even if the main power of the image capturing device 1 is OFF, the RF-ID reader/writer supplies power to the second power supply unit 91 to activate (operate) the image capturing device 1. Therefore, power of the battery 100 in the image capturing device 1 is not reduced.

Referring back to FIG. 316, the first power supply unit 101 receives power from the battery 100 to provide power to the units in the camera. In a quiescent state, however, a third power supply unit 102 provides weak power to the clock 103 and the like. In some cases, the third power supply unit 102 supplies backup power to a part of the second memory 52.

The RF-ID unit 47 receives power from the second antenna to provide power to the second power supply unit 91, thereby operating the second processing unit 95, or operating a data receiving unit 105, a recording unit 106, a reproducing unit 107, a data transfer unit 108 (the communication unit 171), and the second memory 52.

Therefore, in a quiescent state of the camera, no power is consumed. As a result, it is possible to keep the battery 100 of the camera longer.

The following describes processing in FIGS. 320 to 330.

FIG. 320 is a flowchart of processing performed by the camera or card and processing performed by the TV and the RF-ID reader/writer.

The processing performed by the image capturing device 1 (referred to also as a "medium" such as a camera or card) and the processing performed by the TV and the RF-ID reader/writer are explained with reference to a flowchart of FIG. 320.

If the main power is OFF at Step 150*a* in FIG. 320, it is determined at Step 150*b* whether or not activation setting of the RF-ID reader/writer for the main power OFF is made. If the activation setting is made, then the RF-ID reader/writer 46 is turned ON at Step 150*c* and changed to be in a power saving mode at Step 150*e*.

At Step 150*f*, impedance or the like of an antenna unit is measured, or a nearby sensor is measured. When the RF-ID unit is moved into proximity of an antenna of the RF-ID reader/writer 46 at Step 150*g*, it is detected at Step 150*g* whether or not the RF-ID unit is in proximity of or contacts the antenna. If it is detected that the RF-ID unit is in proximity of or contacts the antenna, then the RF-ID reader/writer 46 starts supplying power to the antenna of the medium at Step 150*h*. At Step 150*k*, in the medium, the second power supply unit is turned ON and thereby the second processing unit starts operating. At Step 150*m*, communication between the medium (camera or card) and the RF-ID reader/writer 46 starts.

FIG. 321 is a flowchart of processing that follows the processing in FIG. 320.

When at Step 150, the TV determines whether or not the RF-ID reader/writer 46 receives communication from the medium. If the RF-ID reader/writer 46 receives communication, then mutual authentication starts at Steps 151*a* and 151*f* in FIG. 321. If it is determined at Steps 151*b* and 151*g* that the mutual authentication is successful, information is read out from the second memory at Step 151*d*. At Step 151*e*, the readout information is transmitted to the RF-ID reader/writer 46. At Step 151*i*, the RF-ID reader/writer 46 receives the information. At Step 151*j*, the TV 45 side makes a determination as to whether or not the identification information or the like of the second memory is correct. If the identification information or the like is correct, then it is determined at Step 151*m* whether or not the TV 45 has identification information indicating automatic power ON. If the TV 45 has identification information, then it is determined at Step 151*r* whether or not a main power of the TV is OFF.

FIG. 322 is a flowchart of the processing performed by the image capturing device and the TV, according to Embodiment A1.

If the main power of the TV is OFF, the main power of the TV is turned ON at Step 152*a* of FIG. 322. At Step 152*b*, the TV 45 side makes a determination as to whether or not the second memory 52 has forced display instruction. If the second memory 52 has the forced display instruction, then the TV 45 side changes an input signal of the TV to a screen display signal for displaying the RF-ID at Step 152*d*. At Step 152*e*, the RF-ID reader/writer 46 reads format identification information. At Step 152*f*, the RF-ID reader/writer 46 reads information from the second memory by changing a format of the information to a format according to the format identification information. At Step 152*g*, the TV 45 side makes a determination as to whether or not the second memory has a "password request flag". If the second memory has the "password request flag", then the RF-ID reader/writer 46 reads an "ID of TV not requesting password entry" from the second memory at Step 152*h*. At Step 152*i*, the TV 45 side makes a determination as to whether or not ID of the TV 45 matches the "ID of TV not requesting password entry". If the ID of the TV 45 does not match the "ID of TV not requesting password entry", then the medium reads out a password from the second memory at Step 152*q*. At Step 152*v*, the medium decrypts the password that has been encrypted. At Step 152*s*, the medium transmits the decrypted password to the TV 45 side. Here, at Steps 152*q*, 152*r*, and 152*s*, it is also possible to store the password in a storage device in the server 42 as the data 50 in the server 42.

At Step 152*j*, the RF-ID reader/writer 46 receives the password. At Step 152*k*, the TV 45 displays a password entry screen. At Step 152*m*, the TV 45 determines whether or not the input password is correct. The determination may be made by the server 42. If the determination is made that the input password is correct, then the TV 45 performs display based on the information and program read from the second memory in the RF-ID unit at Step 152*p*.

FIG. 323 is a flowchart of the processing performed by the image capturing device and the TV, according to Embodiment A1.

At Step 153*a* of FIG. 323, the TV 45 side determines whether or not the medium identification information 111 in the RF-ID unit in the second memory indicates that the medium is a camera. If the medium identification information 111 indicates a camera, then the TV 45 displays an icon (characters) of a camera (camera icon) on the display unit at Step 153*b*. On the other hand, if the medium identification information 111 does not indicate a camera, then it is determined at Step 153*c* whether or not the medium identification information 111 indicates a post card. If the medium identification information 111 indicates a post card, then the TV 45 displays an icon of a post card (post-card icon) at Step 153*d*. On the other hand, if the medium identification information 111 does not indicate a post card, the TV 45 further determines at Step 153*e* whether or not the medium identification information 111 indicates an IC card. If the medium identification information 111 indicates an IC card, then the TV 45 displays an icon of an IC card at Step 153*f*. On the other hand, if the medium identification information 111 does not indicate an IC card, the TV 45 still further determines at Step 153*g* whether or not the medium identification information 111 indicates a mobile phone. If the medium identification information 111 indicates a mobile phone, then the TV 45 displays an icon of a mobile phone on a corner of the TV screen.

FIG. 324 is a flowchart of the processing performed by the image capturing device and the TV, according to Embodiment A1.

FIG. 325 is a flowchart of the processing performed by the image capturing device and the TV, according to Embodiment A1.

FIG. 326 is a flowchart of the processing performed by the image capturing device and the TV, according to Embodiment A1.

At Steps 154*a* and 154*i* of FIG. 324, the RF-ID reader/writer 46 reads service detail identification information from the server or the second memory. At Step 154*c*, the TV 45 side determines whether or not the service detail identification information indicates image display service. At Step 154*b*, the TV 45 side determines whether or not the service detail identification information indicates a post card service such as direct mail. At Step 154*d*, the TV 45 side determines whether or not the service detail identification information indicates advertising service.

At Steps 154*f* and 154*j*, the RF-ID reader/writer 46 obtains the server specific information 48 from the second memory of the medium. At Step 154*g*, the TV 45 side determines whether or not the second memory stores the URL 92. If the second memory does not store the URL 92, then the processing proceeds to Steps 154*h* and 154*k* at which the TV 45 obtains the server address information 81 and the user identification information 82 from the second memory.

At Steps 155*a* and 155*p* of FIG. 325, the TV obtains an encrypted password from the second memory. At Steps 155*b*, the TV decrypts the encrypted password. At Step 155*c*, the TV generates URL from the above pieces of information.

At Step 155*d*, even if the second memory stores the URL 92, the TV accesses the server having the URL via the communication unit and the Internet. At Step 155*k*, the TV starts being connected to the server 42. At Step 155*q*, the medium reads out operation program existence identifier 119 from the second memory. At Step 155*e*, the TV determines whether or not the TV has any operation program existence identifier. If the TV has any operation program existence identifier, it is further determined at Step 155*f* whether or not there are plurality of operation programs. If there are a plurality of operation programs, then the TV reads operation program selection information 118 from the second memory at Step 155*r*. At Step 155*g*, the TV determines whether or not the operation program selection information 118 is set. If the operation program selection information 118 is set, the TV selects directory information of a specific operation program at Step 155*h*. At Step 155*s*, the medium reads out directory information 117 of the specific operation program on the server from the second memory and provides the directory information 117 to the TV. At Step 155*i*, the TV accesses the specific operation program in the directory on the server. At Step 155*m*, the server provides the specific operation program to the TV or executes the specific operation program on the server at Step 155*n*. At Step 155*j*, the TV (or the server) starts execution of the specific operation program. At Step 156*a* of FIG. 326, the TV determines whether or not the specific operation program is service using images. If the specific operation program is service using images, then the TV starts checking images not yet uploaded at Step 156*b*.

FIG. 319 is a block diagram of image display method instruction information of the image capturing device according to Embodiment A1.

FIG. 327 is a flowchart of the processing performed by the image capturing device and the TV, according to Embodiment A1.

At Step 156*i*, the TV reads the not-yet-uploaded image data existence identification information 64 from the medium. At Step 156*c*, the TV determines whether or not the not-yet-uploaded image data existence identification information 64 indicates that there is any image not yet uploaded. If there is any image not yet uploaded, the TV reads the not-yet-uploaded-image number 66 and the data capacity 65 from the medium at Step 156*d*. At Step 156*e*, the TV displays (a) the not-yet-uploaded-image number 66 and (b) a prediction time required to upload images which is calculated from the data capacity 65 regarding image not yet uploaded. At Step 156*f*, the TV determines whether or not the medium (camera) is in a state where the medium can automatically upload images. If the medium can automatically upload images, then at Step 156*g*, the TV activates the medium (camera) to upload images not yet uploaded to the server via the first antenna 20 or the second antenna 21 by wireless communication or wired communication having contacts. When Step 156*g* is completed, the processing proceeds to Step 157*a* of FIG. 327. At Step 157*a*, the TV determines whether or not there is a billing program. If there is no billing program, then at Step 157*n*, the TV reads identifier 121 regarding the image display method instruction information which is shown in FIG. 319. At Step 157*b*, the TV determines whether or not the server has the image display method instruction information. If the server has image display method instruction information, then at Step 157*p*, the TV reads, from the medium, directory information 120 regarding a directory in which image display method instruction information is stored on the server. At Step 157*c*, the TV reads, from the medium, the directory information 120 in which the image display method instruction information corresponding to UID or the like is stored. At step 157*d*, the TV obtains the image display method instruction information from the server. Then, the processing proceeds to Step 157*f*.

On the other hand, if the determination is made at Step 157*b* that the server does not have the image display method instruction information, then the processing proceeds to Step 157*e*. At Step 157*e*, the TV obtains the image display method instruction information from the medium (such as a camera). Then, the processing proceeds to Step 157*f*.

FIG. 328 is a flowchart of the processing performed by the image capturing device and the TV, according to Embodiment A1.

At Step 157*f*, the TV starts display of images based on the image display method instruction information. At Step 157*g*, the TV reads an all-image display identifier 123 from the medium. At Step 157*g*, the TV determines whether or not the all-image display identifier 123 indicates that all images are to be displayed. If all images are to be displayed, the TV displays all images at Step 157*r*. On the other hand, if all images are not to be displayed, then at Step 157*h*, the TV displays a part of images in a specific directory identified by the directory information 124 that is read at Step 157*s* from the medium. At Step 157*i*, the TV determines whether or not a list display identifier 125 indicates that images are to be displayed in a list. If the images are to be displayed in a list, then the TV reads a display order identifier 122 at Step 157*t*. At Step 157*j*, the TV displays the images in a list in a date order or an upload order based on the display order identifier. At Step 157*v*, the TV reads a slide show identifier 126 from the medium. At Step 157*k*, the TV determines whether or not the slide show identifier 126 indicates that images are to be displayed as slide show. If the images are to be displayed as a slide show, then at Step 157*m*, the TV displays the images as slide show based on the display order identifier 122. Then, the TV reads image quality prioritization 127 from the second memory of the medium. At Step 158*a* of FIG. 328, the TV determines whether or not the image quality prioritization 127 indicates that the images are to be displayed by prioritizing image quality. If the images are not to be displayed by prioritizing image quality, the TV reads speed prioritization 128 from the medium at Step 158*q* and further determines at Step 158*b* whether or not the speed prioritization 128 indicates that the images are to be displayed by prioritizing a speed. If a speed is to be prioritized, then the TV determines at Step 158*c* whether or not the server stores display audio. At Step 158*s*, the TV reads and checks display audio server directory 130 from the medium. At Step 158*a*, the TV accesses the directory in the server to obtain the display audio and outputs the audio.

At Step 158*e*, the TV determines whether or not all images are to be displayed as priorities. If all images are not to be displayed as priorities, then at Step 158*f*, the TV selects a part of the images. At Steps 158*g*, the TV reads specific directory information 124 from the medium at Step 158*v*, and receives images in the specific directory from the server at Step 158*w*. At Step 158*h*, the TV displays the images in the specific directory. On the other hand, if it is determined at Step 158*e* that all images are to be displayed as priorities, then the TV may display all images at Step 158*i*. At Step 158*j*, the TV determines whether or not the image display is completed. If the image display is completed, then the TV displays a message "view other image(s)?" at Step 158*k*. If the user agrees, then the TV displays a menu of images in different directories at Step 158*m*.

FIG. 329 is a flowchart of the processing performed by the image capturing device and the TV, according to Embodiment A1.

At Step 159*a* of FIG. 329, the TV determines whether or not images captured by a specific user are requested. If images captured by a specific user are requested, then at Step 159*b*, the TV requests the medium to provide (a) specific user all image information 132 at Step 159*m* and (b) a specific user password 133 that is a password of the specific user. At Step 159*c*, the TV determines whether or not the password is correct. If the password is correct, then at Step 159*p*, the TV reads directory information 134 of a directory of a file storing an image list from the medium. At Step 159*d*, the TV accesses the server to access a directory having an image list of the specific user. At Step 159*r*, the TV downloads image data in the directory from the server. At Step 159*e*, the TV displays the images captured by the specific user.

At Step 159*f*, the TV starts color correction routine. At Step 159*g*, the TV reads camera model information from the camera ID 76. At Steps 159*h* and 159*t*, the TV downloads characteristic information of the camera model from the server. Then, at Steps 159*i* and 159*u*, the TV downloads characteristic information of the TV from the server. At Step 159*w*, the server calculates the characteristic information to generate modified information. At Step 159*j*, the TV modifies color and brightness of the display unit based on the pieces of characteristic information of the medium (camera) and the TV. At Step 159*k*, the TV displays the images with the modified color and brightness.

FIG. 330 is a flowchart of the processing performed by the image capturing device and the TV, according to Embodiment A1.

At Step 160*a* of FIG. 330, the TV determines whether or not forced print instruction is selected. Here, if forced print instruction is selected, it is determined at Step 160*b* whether or not the terminal (the TV in the above example) to which the medium (camera) is moved closer is a printer or a terminal connected to the printer. If the terminal is a printer or a terminal connected to the printer, then the terminal obtains, at Step 160*c*, camera model information of the medium (camera) and a model name of the printer for each image data. At Step 160*d*, the terminal modifies each piece of information of the server to generate modified information. At Step 160*p*, the terminal receives directory information 137 of a directory in which the image data to be printed is stored. At Step 160*e*, the terminal accesses the server by using an address of the directory having the image data to be printed (or file name). At Step 160*m*, the server sends the image data stored in the directory to the terminal. At Step 160*f*, the TV receives the image data to be printed. At Step 160g, the terminal prints the image data. At Step 160h, the printing is completed. At Step 160i, for each image data, the terminal records, onto the server, an identifier indicating that one printing process is completed. At Step 160n, the server assigns a print completion identifier to the image data that is stored in the server and has been printed.

Next, the following describes the situation where the medium such as a camera or a post card does not have a memory for storing data.

FIG. 331 is a flowchart of the processing performed by the image capturing device and the TV, according to Embodiment A1.

FIG. 332 is a flowchart of the processing performed by the image capturing device and the TV, according to Embodiment A1.

Steps of FIG. 321 follow the numbers 3, 4, and 5 in circles in FIG. 8.

At Step 161a of FIG. 331, a main power of the TV is turned ON. At Step 161k, the TV reads UID of the RF-ID unit from the second memory. At Step 161b, the TV obtains the UID. At Step 161m, the TV reads the server specific information 48 from the second memory. At Step 161c, the TV accesses a server directory. At Step 161d, the TV searches the server directories for a final server providing service corresponding to the UID.

At Step 161e, the TV determines whether or not such a final server exists. If there is such a final server, then at Step 161g, the TV accesses the final server and reads a user ID, a password, and a service name from a UID list. At Step 161h, the TV determines whether or not a password is requested. If the password is requested, then the TV determines at Step 161i whether or not the readout password is correct. At Step 162a of FIG. 332, the TV determines whether or not the service is regarding photographs or video. If the service is regarding photographs or video, then at Step 162b, the TV (i) reads, from a specific directory in the server associated with the UID, (a) a corresponding program such as a billing program, (b) a list including an address or a file name of image data to be displayed, (c) image display instruction information, (d) forced display instruction, (e) forced print instruction, and (f) camera ID, and (ii) automatically displays the image data or causes the image data to be printed, based on the above pieces of information and procedure.

FIG. 333 is a flowchart of the processing performed by the image capturing device and the TV, according to Embodiment A1.

If needed, password entry is requested at Step 162b. At Step 162c, the TV determines whether or not the user desires to print a specific image. If the user desires to print a specific image, then at Step 162d, the TV adds data of the specific image to the server associated with the UID or to a print directory of the TV. At Step 162e, the TV determines whether or not the TV is connected to a printer and there is an independent printer. If so, then, at Step 162f, the RF-ID unit of the medium such as a post card is moved into proximity of a RF-ID reader/writer of the printer. At Step 163a of FIG. 333, the printer (i) reads UID of the RF-ID from the medium, (ii) thereby reads image data to be printed or a location of the image data from the print directory on the server having the modified information, and (iii) prints the image data. At Step 163b, the printing is completed. Thereby, the above processing is completed.

Step 163i is the number 23 (circle 23) in FIG. 332. At Step 163b, the TV determines whether or not the service is for shopping. If the service is for shopping, then the TV determines at Step 163e whether or not authentication is successful. If the authentication is successful, then at Step 163f, the TV reads, from the server, a shopping/billing program associated with the UID, and executes the program. At Step 163g, the execution of the program is completed. Thereby, the above processing is completed.

Next, the following describes a method of reading information from a RF-ID unit embedded in a post card without a RF-ID reader.

FIG. 334 is a flowchart of the processing performed by the image capturing device and the TV, according to Embodiment A1.

At Step 164a of FIG. 334, the following processing is performed. A second RF-ID unit, on which URLs of relay servers are recorded, is attached to or embedded in the medium such as a post card. On the outer surface of the second RF-ID unit, (a) UID of the second RF-ID unit and (b) information for identifying a first URL of a certain relay server are printed to be displayed by a two-dimensional barcode.

At Step 164b, there is a camera capable of being connected to a main server. The camera has a first RF-ID unit on which a first URL of the main server is recorded. An image capturing unit in the camera optically reads the two-dimensional barcode, and converts the readout information to information for identifying (a) the UID of a second RF-ID unit in the post card and (b) a second URL of a relay server.

At Step 164c, the converted information is recorded onto a memory in the camera.

At Step 164d, the camera selects a specific set of images from images captured by the camera, and stores the set of images into a specific first directory in the main server. At the same time, the camera uploads information of first directory (first directory information) as well as the first URL of the main server, to a specific second directory in the relay server having the second URL. The camera uploads information for associating the UID of the second RF-ID unit with the second directory, to the relay server having the second URL. At Step 164e, the medium such as a post card is mailed to a specific person.

At Step 164f, the person receiving the post card moves the RF-ID unit of the post card into proximity of a RF-ID reader of a TV or the like. Thereby, the TV reads, from the RF-ID unit, the second URL of the relay server and the UID of the post card.

At Step 164g, the TV accesses the relay server having the second URL. Then, the TV reads, from the relay server, (a) a program in the second directory associated with the UID and/or (b) the first URL and the first directory information of the main server on which specific image data is recorded. The TV downloads the image data from the main server. The TV displays the image data on a screen. In the above case, the image capturing unit in the image capturing device according to Embodiment A1 of the present invention reads information from the two-dimensional bar-code that is generally printed in a product or post card to record server information. Then, the image capturing device records the information read from the two-dimensional bar-code, as digital information, onto the second memory of the RF-ID unit. Thereby, the image capturing device allows a RF-ID reader of a TV to read the information. As a result, even a TV without an optical sensor for two-dimensional bar-codes can indirectly read information of two-dimensional bar-codes and automatically access a server or the like.

FIG. 335 is a diagram presenting a display method of the image capturing device and the TV, according to Embodiment A1.

(a) in FIG. 335 illustrates the situation where display is presented when the image capturing device 1 is moved into proximity of a RF-ID antenna 138 of the TV 45.

When the image capturing device 1 is moved into proximity of the antenna 138, the TV 45 displays a camera icon 140 for notifying that the medium is a camera in the manner described previously.

Next, since the number (for example, five) of images not yet uploaded is detected, the TV 45 displays five blank images 142*a*, 142*b*, 142*c*, 142*d*, and 142*e* as if these images were taken out from the camera icon 140.

Thereby, the TV 45 displays "tangible" information of images by changing "materials to information". As a result, the user can perceive the information of images by more natural sense.

Regarding images that have been already uploaded to the server, actual images 143*a*, 143*b*, and 143*c* are displayed as tangible data in the same manner as described above.

(b) in FIG. 335 illustrates the situation where RF-ID is embedded in a post card 139. Since the RF-ID reader/writer 46 of the TV 45 reads attribute information of the post card from the RF-ID. Thereby, the TV 45 displays a post-card icon 141 at a bottom left corner of the display unit of the TV 45 as illustrated in FIG. 22B. The TV 45 also displays images stored in the server or a menu screen as tangible data in the same manner as described with reference to (a) in FIG. 22.

Next, the following processing is described in detail. By the processing, an operation program 116 illustrated in FIG. 317 is transmitted to the TV 45 illustrated in FIG. 316 that is an apparatus (device) communicating with the RF-ID unit 47 of the image capturing device 1. The communicating device (TV 45) executes the transmitted program.

FIG. 336 is a block diagram of a configuration in which the apparatus communicating with the RF-ID unit 47 in the image capturing device 1 executes the transmitted program.

FIG. 336 illustrates a communication system including a part of the image capturing device 1 (the RF-ID 47 and the second antenna 21), the TV 45, and a remote controller 827 of the TV 45.

Here, the image capturing device 1 is implemented as a camera which has the RF-ID unit 47 to perform proximity wireless communication with the RF-ID reader/writer 46. The RF-ID reader/writer 46 is connected to the TV 45 by an infrared communication path. The camera includes the antenna 21, a data receiving unit 105, the second memory 52, and the data transfer unit 108. The antenna 21 is used for the proximity wireless communication. The data receiving unit 105 receives, via the antenna 21, an input signal provided from the RF-ID reader/writer 46. The second memory 52 is a nonvolatile memory holding at least (a) the UID unit 75 that is identification information for identifying the image capturing device 1, and (b) the operation program 116 that is to be executed by the TV 45 with reference to the UID unit 75. The data transfer unit 108 transmits the UID unit 75 and the operation program 116 stored in the second memory 52 to the RF-ID reader/writer 46 via the antenna 21, according to the input signal received by the data receiving unit 105. The UID unit 75 and the operation program 116 transmitted from the data transfer unit 108 are transmitted to the TV 45 via the data transfer unit 108, the antenna 21, the RF-ID reader/writer 46, and then the infrared communication path. The following explains the above units in more detail.

The RF-ID unit 47 in the image capturing device 1 has the second memory 52. The second memory 52 holds the operation program 116. The operation program 116 can be executed by the TV 45 communicating with the RF-ID unit. In more detail, the operation program 116 is an example of the program executed by the TV 45 with reference to the identification information of the image capturing device 1. The operation program 116 is, for example, an execution program such as Java™ program, a virtual-machine script program such as Javascript™ program, or the like.

The reproducing unit in the RF-ID unit 47 reads necessary information and the operation program 116 from the second memory 52. The necessary information is required to execute the operation program 116. The necessary information includes the UID unique to the image capturing device 1, the server specific information including the URL of the server, and the like. The necessary information and the operation program 116 are transmitted to the RF-ID reader/writer 46 in the remote controller 827 via the data transfer unit 108 and the second antenna 21. The remote controller 827 remotely controls the TV 45.

The RF-ID reader/writer 46 of the remote controller 827 receives the necessary information and the operation program from the RF-ID unit 47 of the image capturing device 1 and stores them into a RF-ID storage unit 6001.

A remote-controller signal generation unit 6002 in the remote controller 827 converts the necessary information and the operation program, which are transmitted from the RF-ID unit 47 of the image capturing device 1 and stored in the RF-ID storage unit 6001, to remote-controller signals. The remote-controller signals, such as infrared signals, are widely used in communication for present remote controllers.

To the TV 45, a remote-controller signal transmission unit 6003 transmits the remote-controller signals including the operation program which are generated by the remote-controller signal generation unit 6002.

A remote-controller signal receiving unit 6004 in the TV 45 receives the remote-controller signals from the remote controller 827. A program execution unit 6005, such as a Java™ virtual machine, retrieves the necessary information and the operation program in the RF-ID unit 47 of the image capturing device 1, from the remote-controller signals by using a decryption unit 5504. Thereby, the program execution unit 6005 executes the operation program.

FIG. 337 is a flowchart of processing for transferring and executing the operation program stored in the RF-ID unit.

FIG. 337 is a flowchart of execution of the operation program for "downloading data of images from an image server with reference to identification information (UID in this example) of the image capturing device 1, and displaying the images as a slide show".

FIG. 338 presents an example of description of the operation program for downloading image and executing slide show.

When the remote controller is moved into proximity of the image capturing device 1, the RF-ID reader/writer 46 of the remote controller provides power to the RF-ID unit 47 in the image capturing device 1 via RF-ID communication. Thereby, the UID 75 unique to the image capturing device 1, the URL 48 of the image server (image server URL), and the operation program 116 are read from the second memory 52 (S6001). The readout UID, image server URL, and operation program are transmitted to the remote controller 827 via the data transfer unit 108 and the second antenna 21 (S6002).

Here, as presented in FIG. 338, the operation program includes server connection instruction 6006, download instruction 6008, slide show display instruction 6010, download-completion-time processing set instruction 6007, and download-completion-time instruction 6009.

The remote controller 827 receives the UID, the image server URL, and the operation program from the image capturing device 1 via the RF-ID reader/writer 46 (S6003). A determination is made as to whether or not receiving is completed (S6004). If receiving is completed, then the UID, the image server URL, and the operation program are stored in the RF-ID storage unit 6001 (S6005). Then, the UID, the image server URL, and the operation program are converted to remote-controller signals transmittable by infrared ray (S6006). A determination is made as to whether or not the user performs a predetermined input operation by the remote controller 827 to instruct to transmit the remote-controller signals to the TV 45 (S6007). If the instruction is received by from user, then the remote-controller signal transmission unit 6003 transmits the remote-controller signals including the UID, the image server URL and the operation program to the TV 45 (S6008). In other words, serving as a common remote controller, the remote controller 827 serves also as a relay device that transfers the UID, the image server URL, and the operation program from the image capturing device 1 to the TV 45 by using the embedded RF-ID reader/writer 46.

Next, the TV 45 receives the remote-controller signals from the remote controller 827 (S6009). The decryption unit 5504 in the TV 45 retrieves (decrypts) the UID, the image server URL, and the operation program from the remote-controller signals (S6010). Then, the program execution unit 6005 executes the operation program with reference to the UID and the image server URL (S6011 to S6015). More specifically, by the operation program, connection between the TV 45 and the image server 42 on a communication network is established with reference to the image server URL (S6012, and 6006 in FIG. 338). Then, with reference to the UID unique to a corresponding image capturing unit, image data captured by a specific image capturing unit is selected from the image data 50 stored in the storage device of the image server 42, and the selected image data is downloaded to the TV 45 (S6013, and 6008 in FIG. 338). In other words, the UID is used to select image data associated with the image capturing device 1 indicated by the UID, from among pieces of image data stored in the image server 42. A determination is made as to whether or not the image download is completed (S6014). If the image download is completed, the downloaded images are sequentially displayed as a slide show (S6015, and 6007, 6009, and 6010 in FIG. 338). The download-completion-time processing set instruction 6007 in FIG. 338 is instruction for setting processing to be performed when image downloading is completed. In the example of FIG. 338, the download-completion-time processing set instruction 6007 instructs the instruction 6009 as the processing to be performed when image downloading is completed. Moreover, the processing 6009 calls the processing 6010 for performing a slide show of the images.

It should be noted that, referring to FIGS. 336 and 337, it has been described that the operation program and the necessary information for the operation program are transferred from the image capturing device 1 to the TV 45 via the remote controller 827. However, the RF-ID reader/writer 46 of the remote controller 827 may be provided to the TV 45. In other words, the RF-ID reader/writer 46 may be embedded in the TV 45. Furthermore, the communication path connecting the reader (RF-ID reader/writer 46) to the apparatus may be a wireless communication path such as infrared communication path, or a wired signal cable.

It should also be noted that, in the above-described execution example, the UID is used to select image data associated with the image capturing device 1 from among pieces of image data stored in the image server 42. However, it is also possible to use the UID to identify the image server storing the image data. Here, it is assumed that, in a communication system including a plurality of image servers, UID is associated with an image server storing image data captured by an image capturing device identified by the UID. Under the assumption, if the operation program is created so that a URL of the image server can be identified with reference to the UID, the TV 45 executing the operation program can identify, by using the UID, the image server associated with the UID from the plurality of image servers and thereby download the image data from the identified image server.

It should also be noted that the identification information for identifying the image capturing device 1 is not limited to UID. The identification information maybe any other information regarding the image capturing device 1, such as a serial number, a product serial number, a Media Access Control (MAC) address, or information equivalent to the MAC address, for example, an Internet Protocol (IP) address. Moreover, if the image capturing device 1 serves as an access point on a wireless LAN, the identification information maybe a Service Set Identifier (SSID) or any information equivalent to SSID. It should also be noted that, in the above-described second memory 52, the identification information (UID unit 75) for identifying the image capturing device 1 has been described to be stored separately from the operation program 116. However, the identification information may be stored (described) in the operation program 116.

It should also be noted that the remote-controller signals (in other words, the communication path connecting the reader to the apparatus) are described to employ infrared ray. However, the remote-controller signals are not limited to the above, but may employ a wireless communication method such as Bluetooth. The use of wireless communication that is generally speedier than infrared communication can shorten a time required to transfer an operation program and/or the like.

It should be noted that the operation program is not limited to the program in the format presented in FIG. 338. The operation program may be described in any other programming language. For example, the operation program described in Java™ can be easily executed by various apparatuses (devices), because the program execution circumstances called JavaVM™ have broad versatility. The operation program may be described in a compact programming language in a script format represented by Javascript™ so as to be stored in a small storage capacity. The operation program in such a compact programming language can be stored in the RF-ID unit 47 in the second memory 52 even if the RF-ID unit 47 has a small storage capacity. Moreover, the operation program may be in an executable format applied with processing such as compiling, rather than a source code presented in FIG. 338. The program can reduce a processing load on apparatuses having program execution environments like TV.

FIG. 339 is a block diagram of (a) the TV changing processing of the operation program according to a language code, and (b) a server storing the program.

FIG. 340 is a flowchart of processing for changing processing of the operation program according to a language code.

The following describes, in detail, the processing of changing execution of a program depending on information unique to a display device (such as the TV 45) having a RF-ID reader, with reference to FIGS. 339 and 340.

The TV 45 illustrated in FIG. 339 further includes a language code holding unit 6013. When the operation program received as remote-controller signals is executed to connect the TV 45 to the server 42, the program execution unit 6005 reads a language code from the language code holding unit 6013 to connect the TV 45 to the server 42 compliant to the language code. Then, the operation program is executed to download a server program from the server 42, and executes the downloaded server program. For example, if the language code indicates Japanese language, the TV 45 is connected to the server 42 having a program storage unit 6011 in which a server program compliant to Japanese language is stored, and then the server program is obtained from the program storage unit 6011 to be executed in the TV 45. More specifically, the operation program stored in the RF-ID unit 47 of the image capturing device 1 as illustrated in FIG. 336 executes only connection to the server 42, while other processing such as image display is executed by the server program downloaded from the server 42.

The steps in the above processing are described with reference to FIG. 340. The processing by which the TV 45 receives the operation program and the necessary information for the operation program from the RF-ID unit 47 of the image capturing device 1 is the same as the processing described previously with reference to FIG. 337. In FIG. 340, it is assumed that the server specific information which the TV 45 receives as remote-controller signals includes two different server addresses which are (a) a sever address of a server 42 compliant to English and (a) a server address of a different server 42 compliant to Japanese. It is also assumed that the operation program which the TV 45 receives as remote-controller signals includes instruction for connecting the TV 45 to a server indicated by the server connection instruction 6006 in FIG. 338.

In the execution environments, the TV 45 obtains a language code of the TV 45 (S6016). The TV 45 determines whether or not the language code indicates Japanese language (S6017). If the language code indicates Japanese language, then the TV 45 selects, from the server specific information, a sever address of a server having a program storage unit 6011 storing an operation program for processing compliant to Japanese (S6018). On the other hand, if the language code does not indicate Japanese language, then the TV 45 selects, from the server specific information, a server address of a server having a program storage unit 6011 storing an operation program for processing compliant to English (S6019). Next, the TV 45 is connected to the server 42 with reference to the selected server address (S6021). The TV 45 downloads a server program from the server 42 (S6022, S6023). The TV 45 executes the downloaded server program in the program execution environments (for example, a virtual machine) of the TV 45 (S6024).

It should be noted that the use of the language code has been described in FIGS. 339 and 340, but the language code may be replaced by other information. Examples are a product serial number, a serial number of the display device (TV 45), and the like each of which indicates a country where the display device is on the market or equipped.

FIG. 341 is a block diagram of a home network 6500 connecting the image capturing device to the TV by a wireless LAN.

FIG. 341 illustrates a configuration of a home network 6500 in which the image capturing device 1 and the TV 45 are connected to each other via a wireless LAN or Power Line Communication (PLC). When the image capturing device 1 has a direct communication unit 6501 and the TV 45 has a direct communication unit 6502 so that the image capturing device 1 and the TV 45 can communicate directly with each other via the wireless LAN, the image capturing device 1 can transmit images to the TV 45 without using the server on the Internet. In other words, the image capturing device 1 serves also as a server. In this case, however, some communication mediums such as the wireless LAN used in the home network 6500 are easily intercepted by others. Therefore, safe data communication requires mutual authentication and exchange of encrypted data. For example, for existing wireless-LAN terminals (devices), access points serve as authentication terminals. If such an existing terminal is to authenticate its communication party, the terminal displays all connectable access points on its screen. The user selects one of the displayed access points from the screen. Then, the user presses a Wired Equivalent Privacy (WEP) key to perform encrypted communication. However, the above processing bothers general users. In addition, if a wireless LAN is embedded in home appliances such as a TV, there are so many terminals with which the existing terminal can communicate with authentication. If the user lives in an apartment house, the user can communicate even with terminals in neighbors. As a result, it is difficult for the user to select a terminal to be authenticated. For instance, if a neighbor has a TV 6503 that is the same model as the user's TV 45, the user has difficulty in distinguishing the TV 45 in the user's house from the TV 6503 based on the information displayed on the screen of the existing device.

Embodiment A1 of the present invention can solve the above problem. In Embodiment A1 of the present invention, RF-ID is used to perform authentication. In more detail, an authentication program including a MAC address 58 is recorded, as an operation program, in the second memory 52 in the RF-ID unit 47 of the image capturing device 1. When the image capturing device 1 is moved into proximity of the RF-ID reader/writer 46 of the TV 45, the image capturing device 1 provides the authentication program to the TV 45. The authentication program includes not only the MAC address but also a cryptography key for authentication (hereinafter, "authentication cryptography key") and an authentication command. When the TV 45 recognizes that the information provided from the RF-ID unit 47 includes the authentication command, the TV 45 performs authentication processing. The communication unit 171 in the RF-ID unit 47 cannot communicate with the TV 45, until the image capturing device 1 is physically located in proximity of the RF-ID reader/writer 46. Therefore, it is extremely difficult to intercept the communication between the image capturing device 1 and the TV 45 which is performed in a house. In addition, since the image capturing device 1 is moved into proximity of the TV 45 to exchange data, it is possible to prevent that the image capturing device 1 authenticates a wrong device (apparatus), such as the TV 6503 in a neighbor or a DVD recorder 6504 in the user's house.

FIG. 342 presents an example of an authentication method without using RF-ID unit.

The following is an example of an authentication method without using RF-ID with reference to FIG. 342. A user inputs, to the TV 45, (a) MAC addresses of terminals to be authenticated, such as the camera (the image capturing device 1) and the DVD recorder 6504, which the user intends to authenticate for communication, and (b) authentication cryptography keys 6511 for the terminals. The TV 45 receiving the inputs transmits an appropriate message called a challenge 6513, to a target terminal having the MAC address. When the image capturing device 1 receives the challenge 6513, the image capturing device 1 encrypts the challenge 6513 using the authentication cryptography key 6511, and returns the encrypted challenge 6513 to the TV 45 that is a terminal from which the challenge 6513 has been provided. In receiving the encrypted challenge 6513, the TV 45 decrypts the encrypted challenge 6513 using the authentication cryptography key 6511. Thereby, the TV 45 can authenticate the authentication cryptography key 6511 to prevent user's error and intervention of other malicious users. Next, the TV 45 encrypts a cryptography key 6512*a* for data (hereinafter, a "data cryptography key 6512a") using the authentication cryptography key 6511. Then, the TV 45 transmits the encrypted data cryptography key 6512a to the image capturing device 1. Thereby, it is possible to perform the encrypted data communication between the TV 45 and the image capturing device 1. The TV 45 performs the above-described processing also with the DVD recorder 6504 and other apparatuses (terminals) 6505 and 6506 in order to share the data cryptography key 6512a among them. Thereby, the TV 45 can perform encrypted communication with all terminals (devices, apparatuses, or the like) connected in the home network.

FIG. 343 presents an example of an authentication method using RF-ID unit.

FIG. 343 illustrates an authentication method using RF-ID. In the authentication method using RF-ID, the image capturing device 1 (camera) generates an authentication program 6521a. The camera provides the generated authentication program 6521a from the RF-ID unit 47 in the camera to a RF-ID unit 46 in the TV 45. The authentication program 6521a includes an authentication command, a MAC address of the camera, and an authentication cryptography key 6511 for the camera. When the TV 45 receives the authentication program 6521a with the authentication command, the TV 45 retrieves the MAC address and the authentication cryptography key 6511 from the RF-ID unit 46. The TV 45 encrypts a data cryptography key 6512a using the retrieved authentication cryptography key 6511 and transmits the encrypted data cryptography key 6512a to the retrieved MAC address. The transmission is performed by a wireless-LAN device (terminal). In the authentication method using RF-ID, the authentication is performed automatically without any user's input. Therefore, there is no problem caused by user's input errors. In addition, since the image capturing device 1 (camera) needs to be moved into proximity of the TV 45, it is possible to prevent intervention of other malicious users. This authentication method using RF-ID can eliminate pre-processing such as the above-described challenge. Moreover, the action of physically moving the image capturing device 1 (camera) into proximity of the TV 45 enables the user to easily recognize which terminals the camera has authenticated. Furthermore, if the authentication cryptography key 6511 is not included in the authentication program, the authentication may be performed by a technique of general public key authentication. In addition, the communication device (medium) is not limited to a wireless LAN, but may be any medium, such as PLC or Ethernet™ included in the home network. Moreover, the MAC address may be any identification information for uniquely identifying a communication terminal in the home network.

FIG. 344 presents an example of an authentication method used when it is difficult to move a terminal into proximity of another terminal.

FIG. 344 illustrates an authentication method using RF-ID when it is difficult to move a terminal into proximity of another terminal. For example, when the terminals are a refrigerator and a TV which are difficult to move, it is almost impossible to directly exchange an authentication program between the terminals using RF-ID. In such a situation, Embodiment A1 of the present invention can be implemented by relaying the authentication program between the terminals using a device (such as a remote controller (mobile remote controller) 6531x) that is an accessory of the terminal. In more detail, a RF-ID reader/writer embedded in the remote controller 6531x reads the authentication program from a RF-ID unit in the refrigerator. Thereby, the authentication program is stored in a memory in the remote controller 6531x. A user moves the remote controller 6531x that is mobile. When the remote controller 6531x is moved into proximity of the TV 45, the remote controller 6531x transfers the authentication program from the memory of the remote controller 6531x, to the RF-ID unit of the TV 45. It should be noted that the transfer from the remote controller 6531x to the TV 45 is not limited to use RF-ID technology. Other communication means, such as infrared ray or ZigBee, that is previously set in the remote controller 6531x can be used. Any medium for which security in communication has already been established may be used.

FIG. 345 is a flowchart of an example of processing performed by a camera.

FIG. 345 is a flowchart of authentication performed by the camera (image capturing device 1) side. In an authentication mode, the camera generates an authentication cryptography key and sets a timer (S6541). The camera writes a MAC address of the camera, the generated authentication cryptography key, and an authentication command, into a memory in the RF-ID unit (S6542). When the user moves the camera to bring the RF-ID unit of the camera into proximity of the RF-ID unit of the TV, the camera transfers the information stored in the memory of the RF-ID unit of the camera to the RF-ID unit of the TV (S6543). The camera determines whether or not a response of the transfer is received from the TV within a predetermined time period counted by the timer (S6544). If the response is received within the predetermined time period, then the camera decrypts, by using the authentication cryptography key, encrypted data cryptography key included in the response (S6545). The camera starts communicating with the other device (apparatus) using the data cryptography key (S6546). The camera determines whether or not data communication with the TV is successful (S6547). If the data communication is successful, then the authentication is completed. On the other hand, if data cannot be correctly decrypted (in other words, data communication is not successful), then a notification of authentication error is displayed and the authentication is terminated (S6548). Referring back to Step S6544, if there is no response within the predetermined time period, then the camera cancels the authentication mode (S6549) and then displays a notification of time out error (S6550).

FIG. 346 is a flowchart of an example of processing performed by the TV.

FIG. 346 is a flowchart of authentication performed by the TV 45 side. The TV 45 determines whether or not received information, which is provided from the RF-ID unit of the camera to the RF-ID unit of the TV 45, includes an authentication command (S6560). If the received information does not include the authentication command, then the TV 45 performs other processing according to the received information (S6561). On the other hand, if the received information includes the authentication command, the TV 45 determines that the information received from the RF-ID unit of the camera is an authentication program, and therefore encrypts a data cryptography key in the TV 45 using an authentication cryptography key in the authentication program (S6562). Then, the TV 45 transmits the encrypted data cryptography key to the terminal (the camera) having the MAC address designated in the authentication program (S6563).

Next, the following situation is described in detail with reference to figures. Here, the image capturing device 1 described with reference to FIG. 316 generates or updates a program executable by the TV 45. Then, the image capturing device 1 transmits the program to the TV 45 via the data transmission unit 173. Thereby, the TV 45 executes the program.

FIG. 347 is a block diagram of the first processing unit 35 and the second memory 52 of the image capturing device 1 according to Embodiment A1.

The first processing unit 35 includes a second memory reading unit 7003, a URL generation unit 7004, a program generation unit 7005, a program part storage unit 7006, and a program writing unit 7007.

The second memory reading unit 7003 reads information from the second memory 52 via the recording/reproducing unit 51.

The URL generation unit 7004 reads the UID 75, the server specific information 48, the captured image state information 55, and the image display method instruction information 77 from the second memory 52 via the second memory reading unit 7003. From the above pieces of information, the URL generation unit 7004 generates a URL that is an address of the server 42 to which images have been uploaded from the image capturing device 1.

The UID 75 is identification information for identifying the image capturing device 1. The UID 75 is unique to each image capturing device 1. The URL generated by the URL generation unit 7004 includes UID. For instance, the image server 42, to which images are uploaded, has an image file in a directory unique to each UID. Thereby, a URL address can be generated for each image capturing device 1.

The server specific information 48 is a server name for identifying the server to which the images are uploaded. Via a Domain Name Server (DNS), an IP address of the server 42 is determined to connect the image capturing device 1 to the server 42. Therefore, the server specific information 48 is included in the generated URL.

The image display method instruction information 77 is information for enabling the user to optionally select the list display 78, the slide show display 79, or the like. The URL generation unit 7004 generates the URL based on the image display method instruction information 77. In other words, since the generated URL includes information indicating the list display 78 or the slide show display 79, the image server (the server 42) can determine based on the URL whether the images are to be displayed as the list display or the slide show display.

As described above, based on the UID 75, the server specific information 48, the captured image state information 55, the image display method instruction information 77, and the like which are stored in the second memory 52, the URL generation unit 7004 generates a URL of the image server in which images to be watched are stored. Then, the URL generation unit 7004 provides the generated URL to the program generation unit 7005.

The program generation unit 7005 generates a program executable by the TV 45, based on (a) the URI generated by the URL generation unit 7004, and (b) forced display instruction 7000, forced print instruction 136, and format identification information 7001 stored in the second memory 52. It should be noted that the program generation unit 7005 can generate a new operation program based on the above-described information, which is a method of generating a new operation program. The program generation unit 7005 can also generate such a new operation program by updating an operation program that has been already generated.

The program generated by the program generation unit 7005 is executable by the TV 45. The program should be compiled into a machine language used in a system controller (not shown) of the TV 45, so that the system controller can execute the program. In this case, the program generation unit 7005 has a compiler to convert the generated program to a program in an executable format.

However, the above-described compiler is not necessary if the program in a text format (script) (for example, a general Java™ script) is executed by a browser in the TV 45.

The URL provided to the program generation unit 7005 is used to connect the TV 45 to the image server (server 42) in which images are stored. By using the URL, the program generation unit 7005 generates or updates a connection program (hereinafter, referred to also as a "server connection program" or "connection program") for connecting the TV 45 to the image server.

The forced display instruction 7000 is optional and used in the following situation. For example, there is the situation where, while the user watches on the TV 45 a TV program provided by general broadcast waves, the RF-ID reader/writer 46 of the TV 45 becomes communicable with the image capturing device 1 via the second antenna 21. In the situation, the forced display instruction 7000 is used to automatically set the TV 45 into a browser watching mode so that image data provided from the image server is displayed on the TV 45. If this option is selected, the program generation unit 7005 generates a program for forcing the TV 45 to display image data.

The forced print instruction 136 is optional and used in the following situation. For example, there is the situation where, while the user watches on the TV 45 a TV program provided by general broadcast waves, the RF-ID reader/writer 46 of the TV 45 becomes communicable with the image capturing device 1 via the second antenna 21. In the situation, the forced print instruction 136 is used to automatically print image data stored in the image server by a printer (not shown) connected to the TV 45. If this option is selected, the program generation unit 7005 generates a program for forcing the TV 45 to print image data by the printer.

The format identification information 7001 is information of a format by which image data is to be displayed. When an option of language code optimization selection in the format identification information 7001 is selected, the program generation unit 7005 generates a program for selecting a URL to be connected, based on the language code set in the TV 45. The following is an example in the situation where the option of language code optimization selection in the format identification information 7001 is selected. If the language code of the TV 45 indicates Japanese language, the program generation unit 7005 selects a Japanese site as the URL to be connected. On the other hand, if the language code of the TV 45 does not indicate Japanese language, the program generation unit 7005 selects an English site as the URL to be connected. Or, the URL generation unit 7004 may generate two URLs for the Japanese site and the English site, and provide the two URLs to the program generation unit 7005.

The program part storage unit 7006 holds program command information used by the program generation unit 7005 to generate a program. A program part stored in the program part storage unit 7006 may be a general library or an Application Programming Interface (API). In order to generate a connection command for connecting the TV 45 to the server, the program generation unit 7005 combines a server connection command "Connect" in the program part storage unit 7006 with the URL generated by the URL generation unit 7004. Thereby, the program generation unit 7005 generates or updates a connection program for connecting the TV 45 to the server indicated by the URL.

The program writing unit 7007 is an interface used to write the program generated by the program generation unit 7005 to the second memory 52.

The program provided from the program writing unit 7007 is stored into a program storage unit 7002 in the second memory 52 via the recording/reproducing unit 51.

When the image capturing device 1 is moved to bring the RF-ID unit of the image capturing device 1 into proximity of the RF-ID reader/writer 46 connected to the TV 45, the reproducing unit reads out the program from the program storage unit 7002 in the second memory 52. Then, transmission signals indicating the program are transmitted to the RF-ID reader/writer 46 via the data transfer unit 108 and the second antenna 21. The TV 45 receives the transmission signals via the RF-ID reader/writer 46. The TV 45 executes the received program.

The TV 45 has the product serial number 7008, the language code 7009, and a program execution virtual machine 7010.

The product serial number 7008 is a product serial number of the TV 45. From the product serial number 7008, it is possible to learn a manufacture date/time, a manufacture location, a manufacturing line, and a manufacturer of the TV 45.

The language code 7009 is predetermined in the TV 45 to be used in displaying a menu, for example. The language code 7009 is not limited to be predetermined, but can be switched to another by the user.

The program execution virtual machine 7010 is a virtual machine that executes a received program. The program execution virtual machine 7010 may be implemented as hardware or software. For example, the program execution virtual machine 7010 may be a Java™ virtual machine. The Java™ virtual machine is a stack or interpreter virtual machine that executes defined instruction sets. If the image capturing device 1 has the virtual machine, the program generated by the program generation unit 7005 in the image capturing device 1 is compliant to any execution platforms. As a result, the program generation unit 7005 can generate a program executable in any platforms.

FIG. 348 is a flowchart of processing performed by the program generation unit 7005 of the image capturing device 1.

First, the program generation unit 7005 initializes information used to generate a program (S7000).

Next, based on the server specific information 48 stored in the second memory 52, the program generation unit 7005 generates a connection command for connecting the TV 45 to the server 42, by using the URL generated by the URL generation unit 7004. In order to generate the connection command, the program generation unit 7005 selects an instruction set (for example, "Connect" in the drawing) for a server connection command from the program part storage unit 7006, and combines the selected instruction set with the URL. Thereby, a server connection program (for example, "Connect (URL)") is generated.

Then, the program generation unit 7005 examines the forced display instruction 7000 in the second memory 52 so as to determine whether or not the forced display instruction 7000 is selected (S7001). If the forced display instruction 7000 is selected, then the program generation unit 7005 calls an instruction set for a forced display program from the program part storage unit 7006, and thereby generates a forced display command (S7002). The generated forced display command is added to the program (S7004).

On the other hand, if the forced display instruction 7000 is not selected, then the program generation unit 7005 does not generate the forced display command, but proceeds to S7005.

Next, the program generation unit 7005 makes a determination as to whether the forced print instruction in the second memory 52 is selected (S7005). If the forced print instruction is selected, then the program generation unit 7005 generates a forced print command for forcing the TV 45 to print, by a printer, an image file stored in the server 42 (S7006). The generated print command is added to the program (S7007).

Then, the program generation unit 7005 examines the image display method instruction information 77 in the second memory 52 so as to determine whether or not the list display 78 is selected (S7008). If the list display 78 is selected, then the program generation unit 7005 generates a list display command for causing the TV 45 to display a list of the image file stored in the server 42 (S7009). The generated list display command is added to the program (S7010).

After that, the program generation unit 7005 examines the image display method instruction information 77 in the second memory 52 so as to determine whether or not the slide show 79 is selected (S7011). If the slide show 79 is selected, then the program generation unit 7005 generates a slide show command for causing the TV 45 to display a slide show of the image file stored in the server 42 (S7012). The generated slide show command is added to the program (S7013).

As described above, based on the information set in the second memory 52, the program generation unit 7005 in the image capturing device 1 generates a program used to display images on the TV 45, by using an instruction command set that is stored in the program part storage unit 7006 to generate the program.

It should be noted that, in Embodiment A1, there are commands for the forced display instruction, the forced print instruction, the list display, and the slide show display. However, the commands (programs) are not limited to the above. For example, if a command for the forced display instruction is to be generated as a program, the program generation unit 7005 can also generate a determination command for determining whether or not the apparatus (device) executing the program has a display device or display function, and add the generated determination command to the program. Thereby, the command for the forced display instruction is executed only if the apparatus executing the program has a display device or display function. As a result, the determination command can prevent confusion in the apparatus executing the program. The same goes for a command for the forced print instruction. The program generation unit 7005 may also generate a determination command for determining whether or not the apparatus executing the program has or is connected to a printing function, and add the generated determination command to the program. Thereby, the command for the forced print instruction is executed only if the apparatus executing the program has or is connected to a printing function.

The following describes execution of the program generated or updated by the program generation unit 7005 in the image capturing device 1.

FIG. 349 is a flowchart of execution of the program generated or updated by the program generation unit 7005.

The program is transmitted from the image capturing device 1 to a device (apparatus) different from the image capturing device 1 via the second antenna 21 of the image capturing device 1. Then, the program is executed by the different device. In Embodiment A1, the different device is the TV 45. The TV 45 receives the program via the RF-ID reader/writer 46 and executes the received program by a controller or virtual machine (not shown) in the TV 45.

First, the program is executed to read the language code set in the TV 45, as unique information of the TV 45 (S7020). The language code is predetermined by the user to be used in displaying a menu and the like on the TV 45.

Next, the program is executed to determine a language indicated in the language code. First, a determination is made as to whether or not the language code indicates Japanese language (S7021). If the determination is made that the language code indicates Japanese language, then a connection command for a Japanese site is selected from the connection commands in the program (S7022). On the other hand, if the determination is made that the language code does not indicate Japanese language, then a connection command for an English site is selected from the connection commands in the program (S7023). It should be noted that it has been described in Embodiment A1 that a determination is made as to whether or not the language code indicates Japanese language, and thereby a connection command is selected from the connection command for connecting to a Japanese site and the connection command for connecting to an English site. However, it is also possible that the program includes a plurality of connection programs compliant to various language codes. Thereby, the program can be compliant to two or more language codes. As a result, usability is improved. Next, according to the selected connection command, the program is executed to connect the TV 45 to the URL indicted in the connection command (S7024).

Then, a determination is made as to whether or not the connection to the URL indicted in the connection command is successful (S7025). If the connection is failed, then the display unit of the TV 45 displays warning indicating the connection failure (S7027). On the other hand, if the connection is successful, then a command for displaying a slide show of an image file stored in the server is executed to display the slide show (S7026).

It should be noted that the above is the situation where the operation program is for displaying images as a slide show. However, the operation program is not limited to the above. The program may be used for performing list display, forced display, or forced printing. If the operation program is for forced display, a step (command) of automatically changing setting of the TV 45 to setting of displaying an image file stored in the server is added to the program. Thereby, the user does not need to change the setting of the TV 45 by manual in order to display images provided from the image server. In the case of the forced printing, a command for automatically changing setting of the TV 45 to a printable mode is added to the program. Moreover, in the case of each of the forced printing and forced display, a determination command for determining whether or not the TV 45 has a printing function or a displaying function is added to the program. Thereby, the forced print command is not executed in an apparatus (device) without a printing function. Furthermore, the operation program in Embodiment A1 of the present invention may be a connection program for leading other programs. For example, the operation program may be a loader program, such as a boot-loader for loading other programs to be executed.

As described above, Embodiment A1 of the present invention is characterized in that the program generation unit 7005 is included in the first processing unit 35 of the image capturing device 1 that is a device having RF-ID communication means (such as the data transfer unit 108 and the second antenna 21). It is also characterized in that the program generated or updated by the program generation unit 7005 is executed by a different device (apparatus) except the image capturing device 1 according to Embodiment A1 of the present invention that is a communication device having RF-ID.

Conventionally, a device having RF-ID needs to transfer ID information (tag information), which the device has, from a RF-ID communication unit to another device (for example, the TV 45 according to Embodiment A1 of the present invention). The device (apparatus) receiving the ID information should previously hold operation programs each unique to a corresponding device having RF-ID. Therefore, if new products having RF-ID technology appear, the receiving device needs to install an operation program corresponding to the new products and execute the program. Otherwise, the receiving device is excluded as not being compliant to the new products. The installation of operation programs requires technical knowledge. Not everyone can perform the installation. Therefore, if various new devices having RF-ID are produced, other devices such as the TV 45 of Embodiment A1 of the present invention become obsolete. As a result, property values of user's devices are damaged.

According to the disclosure of Embodiment A1 of the present invention, the device having RF-ID technology has the program generation unit 7005 and sends not ID information (tag information) but a program to another device (apparatus) such as the TV 45. The apparatus such as the TV 45 receives and executes the program. Therefore, the receiving apparatus does not need to previously have operation programs for various devices having RF-ID. Even if a new device having RF-ID technology appears, the receiving apparatus does not need to install a new program for the device. Therefore, usability is significantly improved.

Therefore, the terminal such as a TV does not need to previously have application programs for respective items, kinds, or application systems of various objects having RF-ID. Thereby, the terminal such as a TV does not need to previously have a storage device, either, for holding various application programs. In addition, maintenance such as version-up of the programs in the terminal is not necessary.

The program generated by the program generation unit 7005 is useful if it is executable in any execution platforms such as a Java™ language. Therefore, if the device (apparatus) such as the TV 45 executing programs has a Java™ virtual machine, programs generated by any devices (apparatuses) can be executed.

It should be noted that the program generation unit 7005 according to Embodiment A1 of the present invention may have a function of updating the program previously stored in the program storage unit 7002 of the second memory 52. The situation of updating a program produces the same advantages as that in the situation of generating a program. The generating or updating performed by the program generation unit 7005 may be generating or updating data used in executing a program by the TV 45. In general, the program includes additional initialization setting data. The additional data is used to switch an execution mode or to set a flag. Therefore, generating or updating of the additional data is equivalent to generating or updating of the program, without deviating from the inventive concepts of the present invention. This is because, for execution of a program, it is merely a matter of design whether a parameter for mode switching or the like is to be held and read as data, or is to be included in the program to be executed. Therefore, when the program generation unit 7005 according to Embodiment A1 of the present invention generates or updates a program, the program generation unit 7005 can also generate data such a parameter sequence used by the program. The parameter is generated based on the forced display instruction 7000, the forced print instruction 136, the image display method instruction information 77, the format identification information 7001, or the like stored in the second memory 52.

The following describes characteristic structures and processing of the second memory 52 and the first processing unit 35 in the image capturing device 1 that is a communication device having RF-ID according to Embodiment A1 of the present invention. In Embodiment A1 of the present invention, the image capturing device 1 that is a communication device having RF-ID has a use status detection unit in the first processing unit 35. The use status detection unit detects a trouble related to operation, a power consumption status, or the like. The image capturing device 1 generates a program for displaying the result of the detection (use status) on the TV 45 that is a device (apparatus) different from the image capturing device 1.

FIG. 350 is a block diagram of characteristic structures of the second memory 52 and the first processing unit 35 in the image capturing device 1 according to Embodiment A1 of the present invention.

The second memory 52 includes the UID 75, the server specific information 48, the camera ID 135, and the program storage unit 7002.

The UID 75 is a serial number unique to the image capturing device 1, and used to identify the single image capturing device 1.

The server specific information 48 is information for identifying the server 42 to which image data captured by the image capturing device 1 is transmitted by the communication unit 37. The server specific information 48 includes a sever address, a storing directory, a login account, a login passwords, and the like.

The camera ID 135 includes a product serial number, a manufacturing year/month/date, a manufacturer, a manufacturing line, a manufactured location, and the like of the image capturing device 1. The camera ID 135 also includes camera model information for identifying a model of the image capturing device 1.

The first processing unit 35 includes the second memory reading unit 7003, a use status detection unit 7020, the program generation unit 7005, the program part storage unit 7006, and the program writing unit 7007.

The second memory reading unit reads information from the second memory 52 via the recording/reproducing unit 51. In Embodiment A1 of the present invention, the second memory reading unit 7003 reads the UID 75, the server specific information 48, and the camera ID 135 from the second memory 52, and provides the pieces of information to the program generation unit 7005. Reading of the pieces of information from the second memory 52 is performed when a readout signal is provided from the use status detection unit 7020 that is described later.

The use status detection unit 7020 detects a use status of each unit included in the image capturing device 1. The use status detection unit 7020 includes sensors each detecting a trouble in operation of a corresponding unit included in the image capturing device 1. Results of the detection of the sensors in respective units are provided to the use status detection unit 7020. The sensors for the respective units provide the use status detection unit 7020 with trouble information, battery duration, a power consumption amount, and the like. For example, the image capturing unit 30 provides the use status detection unit 7020 with information indicating whether or not an image capturing operation of the image capturing unit 30 has any trouble (whether or not the image capturing unit 30 functions correctly, and whether or not the image capturing unit 30 responds to a call from the use status detection unit 7020). The video processing unit 31 provides the use status detection unit 7020 with information indicating whether or not data processing for image data captured by the image capturing unit 30 has any trouble (whether or not the video processing unit 31 functions correctly, and whether or not the video processing unit 31 responds to a call from the use status detection unit 7020). The power supply unit 101 provides the use status detection unit 7020 with a voltage level of the battery and a total power consumption amount. The communication unit 37 provides the use status detection unit 7020 with information indicating whether or not the communication unit 37 is successfully connected to the server or the Internet (whether or not the communication unit 37 functions correctly, and whether or not the communication unit 37 responds to a call from the use status detection unit 7020). The display unit 6*a* provides the use status detection unit 7020 with information indicating whether or not display processing has any trouble, whether or not the display unit 6*a* correctly responds to a call from the use status detection unit 7020, and the display unit 6*a* functions correctly. Based on the above pieces of status information provided regarding the respective units, the internal trouble detection unit 7021 in the use status detection unit 7020 determines whether or not each of the units has any trouble in its functional operation. If there is a trouble, then the use status detection unit 7020 provides the program generation unit 7005 with information for specifying the trouble. The use status detection unit 7020 has a power consumption detection unit 7022. The power consumption detection unit 7022 generates power consumption information based on the total power consumption information provided form the power supply unit, and then provides the power consumption information to the program generation unit 7005.

The program generation unit 7005 generates a program for displaying, on the TV 45, the information for specifying a trouble or the power consumption information which is provided from the use state detection unit 7020. For generation of a program, instruction sets to be included in the program are previously stored in the program part storage unit 7006. Therefore, the program generation unit 7005 generates (a) a display command ("display" in FIG. 350) for displaying a trouble or a power consumption amount, and (b) a program for displaying information for specifying a location of the trouble and information for specifying the trouble in detail. It should be noted that the power consumption amount may be converted to a carbon dioxide emission amount, and therefore a program may be generated to display the carbon dioxide emission amount.

The program generated by the program generation unit 7005 is stored in the program storage unit 7002 in the second memory 52 via the program writing unit 7007.

The program stored in the program storage unit 7002 in the second memory 52 is transmitted to the RF-ID reader/writer 46 of the TV 45 via the data transfer unit 108 and then the second antenna 21.

The TV 45 executes the received program by the program execution virtual machine 7010.

With the above-described structure, the program generation unit 7005 in the first processing unit 35 generates a program for displaying, on the TV 45, trouble information or use status information detected by the use status detection unit 7020 regarding use of the image capturing device 1. The program is transmitted to the TV 45 that displays the trouble information or the use status information of the image capturing device 1. Thereby, the TV 45 can present the trouble information or the use status information to the user, without installing a plurality of programs compliant to various devices including the image capturing device 1.

In conventional systems, each of devices such as an image capturing device, a camcorder, an electric toothbrush, and a weight scale is provided with a simple display function such as a liquid crystal device, so as to display the trouble information or the use status information on the corresponding display function. Therefore, the display function has a low display capability for merely displaying the trouble information as a symbol sequence or an error code. When the trouble information is presented, the user needs to read instruction manual to check what kind of trouble it is. Some users have lost instruction manual and therefore obtain more information from a website on the Internet.

In the system according to Embodiment A1 of the present invention, however, a program for displaying trouble information can be executed by the TV 45 not by the image capturing device 1. The TV 45, which displays the trouble information detected by each device such as the image capturing device 1, has a display capability higher than that of the conventional systems. Therefore, the system according to Embodiment A1 of the present invention can solve the above conventional problem.

The following describes, in detail with reference to figures, the situation where a program generated by the image capturing device 1 described with reference to FIG. 3 is executed by a plurality of apparatuses (devices) including the TV 45.

FIG. 351 illustrates a system in which a program generated by the image capturing device 1 is executed by a plurality of apparatuses.

The system includes the image capturing device 1, the TV 45, a remote controller (with display function) 6520, and a remote controller (without display function) 6530.

The TV 45 includes the RF-ID reader/writer 46 and a wireless communication device 6512. The wireless communication device 6512 is, for example, a general infrared communication device currently used as many remote controllers of home appliances, or a short-range wireless communication device used for home appliances using radio waves, such as Bluetooth and ZigBee.

The remote controller (with display function) 6520 includes a transmission unit 6521, a display unit 6523, an input unit 6524, a RF-ID reader 6522, a memory 6526, and a program execution virtual machine 6525. The transmission unit 6521 transmits signals to the wireless communication device 6512 of the TV 45. The display unit 6523 displays video. The input unit 6524 receives key inputs from a user. The RF-ID reader 6522 communicates with the RF-ID unit 47. The memory 6526 stores a program received by the RF-ID reader 6522. The program execution virtual machine 6525 is a virtual machine that executes the program received by the RF-ID reader 6522. For instance, recent mobile phones are example of the remote controller (with display function) 6520, having an infrared communication function, Bluetooth, a RF-ID reader, a liquid crystal display, a key input unit, a Java™ virtual machine, and the like. The display unit 6523 and the input unit 6524 may be a liquid crystal display and a plurality of character input buttons, or may be integrated into a liquid-crystal touch panel, for example.

The remote controller (without display function) 6530 includes a transmission unit 6521, an input unit 6533, a RF-ID reader 6532, and a memory 6535. The transmission unit 6531 transmits signals to the wireless communication device 6512 of the TV 45. The input unit 6533 such as buttons receives key inputs from a user. The RF-ID reader 6532 communicates with the RF-ID unit 47. The memory 6535 temporarily stores data received by the RF-ID reader 6532.

The remote controller (without display function) 6530 is, for example, a general remote controller having a RF-ID reader. Remote controllers are common accessory devices of TVs.

In Embodiment A1 of the present invention, there are the following four possible situations from which the user selects a preferred one. In the first situation, the program generated by the image capturing device 1 is transmitted directly to the TV 45 via the RF-ID reader/writer 46 of the TV 45, and executed by the TV 45. In the second situation, the program generated by the image capturing device 1 is transmitted indirectly to the TV 45 via the remote controller (without display function) 6530, and executed by the TV 45. In the third situation, the program generated by the image capturing device 1 is transmitted indirectly to the TV 45 via the remote controller (with display function) 6520, and executed by the TV 45. In the fourth situation, the program generated by the image capturing device 1 is transmitted to the remote controller (with display function) 6520, and executed by the remote controller (with display function) 6520.

The first situation has been already described above in Embodiment A1. Therefore, the first situation is not described in detail again below.

The following describes the above second to fourth situations.

In the second situation, a program generated by the image capturing device 1 is executed by the TV 45, via the remote controller (without display function) 6530, such as general TV remote controllers, that does not have a graphical display device such as a liquid crystal panel.

When the user moves the image capturing device 1 to bring the RF-ID unit 47 to the RF-ID reader 6532, the RF-ID reader 6532 reads the program generated by the image capturing device 1 to store the program in the memory 6535.

Then, when the user presses the input unit 6533, the program held in the memory 6535 is transmitted from the transmission unit 6531 to the wireless communication device 6512 of the TV 45. The program execution virtual machine 7010 in the TV 45 executes the program. If the wireless communication device 6512 is a directional infrared communication device, the user presses the input unit 6533, facing the remote controller (without display function) 6530 to the TV 45. If the wireless communication device 6512 is a non-directional short-range wireless communication device, such as devices using Bluetooth or ZigBee, the program is transmitted to the TV 45 that is previously paired with the remote controller (without display function) 6530. In the case of the short-range wireless communication device, it is also possible that the program is automatically transmitted to the paired TV 45 when the RF-ID reader 6532 reads the program from the RF-ID unit 47, without user's pressing of the input unit 6533.

The remote controller (without display function) 6530 may have a display unit, such as a LED 6534, for notifying the user of that data read by the RF-ID reader 6532 is stored in the memory 6535. The LED 6534 is lit up to encourage the user to press the input unit 6533, when the program is read by the RF-ID reader 6532 and stored in the memory 6535. The LED 6534 is lit out when the transmission of the program to the TV 45 is completed. Thereby, it is possible to clearly notify the user of that the remote controller (without display function) holds the program. The LED 6534 may be an independent LED or integrated into the input unit 6533.

In the second situation, even if the user is far from the TV 45, the program can be executed by the TV 45 by using the remote controller (without display function) 6530 in the user's hand.

In the third and fourth situations, if the remote controller (with display function) 6520 has a program execution virtual machine as high-function mobile phones called smart phones do, the user can select whether the program generated by the image capturing device 1 is executed on the remote controller (with display function) 6520 or the program is transmitted to the TV 45 to be executed on the TV 45.

When the user moves the image capturing device 1 to bring the RF-ID unit 47 to the RF-ID reader 6522, the RF-ID reader 6522 reads the program generated by the image capturing device 1 to store the program in the memory 6535.

FIG. 352 is a sequence where the program generated by the image capturing device is executed by a remote controller with display function.

The following describes the processing performed by the remote controller (with display function) 6520 in more detail with reference to a flowchart of FIG. 352.

First, a program read by the RF-ID reader 6522 is transmitted to the program execution virtual machine 6525 and executed by the program execution virtual machine 6525 (S6601).

Next, a determination is made as to whether or not the remote controller 6520 has a display function (S6602). If the remote controller 6520 does not have any display function (N at S6602), then the program is transmitted to the TV 45 via the transmission unit 6521 and then the processing is completed. In this situation, the program is executed by the TV 45.

If the remote controller 6520 has a display function (Y at S6602), then a further determination is made as to whether or not the remote controller 6520 is paired with the TV 45 that is a transmission destination (S6603). If the remote controller 6520 is not paired with the TV 45 (N at S6603), then a rest processing of the program is executed by the display unit 6523 of the remote controller 6520. On the other hand, if the remote controller 6520 is paired with the TV 45 (Y at S6603), then the display unit 6523 displays a dialog message "Display on TV or on Remote Controller?" to encourage the user to select one of the options (S6604).

Then, the remote controller 6520 receives user's entry by the input unit 6524 (S6605). A determination is made as to whether or the user selects to display data on the TV 45 (S6606). If the user selects the TV 45 to display data (Y at S6606), then the program is transmitted to the TV 45 via the transmission unit 6521 and thereby the processing is completed. In this situation, the program is executed by the TV 45. On the other hand, if the user selects the remote controller to display data (N at S6606), then a rest processing of the program is executed by the remote controller 6520 using the display unit 6523 (S6607).

It should be noted that the "rest processing of the program" refers to displaying of a status of a battery, a trouble status, or an instruction manual regarding the image capturing device 1, but, of course, not limited to those described in Embodiment A1.

With the above structure, a program generated by the image capturing device 1 is transmitted to the remote controller with display function, then a capability of the remote controller with display function is examined, and a determination is made by the remote controller as to which apparatus (device) is to execute rest processing of the program. Thereby, the remote controller does not need to previously install various programs compliant to a plurality of apparatuses. The user can execute the program in his/her preferred manner.

It should be noted that it has been described in Embodiment A1 that the determination is made based on whether or not the remote controller has a display function and based on a pairing status of the remote controller. However, it is not limited to the above. A program may execute any determination based on a capability of the apparatus, such as a communication capability, an audio-video reproduction capability, a capability of an input unit, a capability of an output device, and the like.

As described above, the storage region of the RF-ID unit holds not only information but also a program describing operations of an apparatus (device). This considerably simplify changing or updating of a program, which has been necessary for conventional techniques to change operations of apparatuses. In addition, it is possible to deal with addition of various new functions and an increase of cooperative apparatuses. Moreover, proximity communication using RF-ID technology is a simple operation achieved by simply bringing a device into proximity of an apparatus, which the user can easily understand. Therefore, conventional bothersome device operations by using buttons and a menu are simplified. As a result, the complicated device operations are changed to be convenient.

[Embodiment A2]

Embodiment A2 of the present invention is described below. In Embodiment A2, actual operations of the communication system are described. In the communication system, images captured by a camera are uploaded to a server, and then downloaded by a simple operation to a TV to be displayed. The whole configuration of the communication system according to Embodiment A2 is the same as that of the communication system according to Embodiment A1.

FIG. 353 (FIGS. 353A, 353B, and 353C) is a flowchart of uploading steps in a camera according to Embodiment A2.

As noted above, the whole drawing including FIGS. 353A to 353C is simply referred to as "FIG. 353" when necessary. The same applies to FIG. 355 and the like.

FIG. 353 is a flowchart of processing performed by a camera (the image capturing device 1) to upload photographs (images). First, the camera captures images (Step S5101). Then, the captured images are stored into the third memory (Step S5102). Then, the camera updates information stored in the second memory (Step S5103). The second memory updating process will be described later. Next, the camera determines whether or not the communication unit is connectable to the Internet (Step S5104). If connectable, then the camera generates a URL (Step S5105). The URL generation process will be described in more detail later. After generating the URL, the camera uploads the captured images (Step S5106). In completing the uploading process, the camera disconnects the communication unit from the Internet (Step S5107). As a result, the processing is completed. The uploading process will be described in more detail later.

The second memory updating process of Step S5103 enables the server 42 and the camera to share identification information for distinguishing photographs that have already been uploaded to the server 42 from photographs that have not yet been uploaded to the server 42. Examples of the uploading process at Step S5106 are given as following cases 1 to 4.

In case 1, the final capturing time (final capturing date/time) 68 is previously stored in the second memory, and then updated after the captured images are stored into the third memory (Step S5111).

Comparison of a time of uploading the captured images to the final capturing time 68 of the camera allows the server 42 and the camera to share identification information of the uploaded photographs.

In case 2, the above advantages can be produced also by generating existence identifiers 64 of images not yet uploaded to the server 42, with reference to images uploaded to the server 42 among the captured images, and storing the generated existence identifiers 64 into the second memory (Step S5121).

In case 3, it is also possible that the not-yet-uploaded image information hashed information 67 is stored in the second memory (Step S5131). Thereby, an amount of the information stored in the second memory is reduced, thereby saving a capacity of the second memory.

In case 4, it is further possible that image serial numbers are chronologically generated for captured images, and thereby the final image serial number 69 in the second memory is updated (Step S5141). Thereby, even if a time counted by the camera is not correct, it is possible to synchronize information of uploaded photographs between the server 42 and the camera.

FIG. 354 depicts details of the URL generation process at Step S5105.

The camera reads, from the second memory, the server specific information 48 including the server address information 81, the login ID 83, and the password 84 (Step S5201). Based on the server specific information 48, the camera generates a URL (Step S5202).

FIG. 355 (FIGS. 355A to 355D) depicts details of the uploading process at Step S5106.

As noted above, the whole drawing including FIGS. 355A to 355D is simply referred to as "FIG. 355" when necessary.

The cases 1 to 4 in FIGS. 355A to 355D correspond to the above-described cases 1 to 4 of the second memory updating process in FIG. 353, respectively.

In case 1, the camera receives, from the server 42, a final upload time (final upload date/time) that is a time of finally uploading to the server 42 (Step S5211). Then, the camera compares the final upload time to the final capturing time (Step S5212). If the final capturing time is later than the final upload time (in other words, if there is any image captured after final uploading), then the camera uploads, to the server 42, any images captured after the final upload time (Step S5213).

In case 2, the camera checks not-yet-uploaded image data existence identifiers 64 in the second memory (Step S5231). Thereby, the camera determines whether or not there is any image not yet uploaded (Step S5232). If there is any image not yet uploaded, then the camera uploads images not yet uploaded, to the server 42 (Step S5233). Then, the camera updates the uploaded-image information 61 in the second memory (Step S5234).

In case 3, the camera checks the not-yet-uploaded image information hashed information 67 in the second memory (Step S5301). Thereby, the camera determines whether or not the not-yet-uploaded image information hashed information 67 in the second memory is the same as hashed information that is generated by hashing NULL (Step S5302). If the not-yet-uploaded image information hashed information 67 is not the same as the hashed information regarding NULL, then the camera determines that there is an image not yet uploaded to the server 42 and therefore uploads, to the server 42, any images that are stored in the third memory but have not yet been uploaded to the server 42 (Step S5303).

In case 4, the camera receives, from the server 42, an image serial number of a finally uploaded image (Step S5311). Then, the camera determines whether or not the image serial number matches the final image serial number 69 in the second memory (Step S5312). If the image serial number does not match the final image serial number 69, then the camera uploads any images having UIDs that are newer than UID of the final image serial number 69 that is received from the server 42 (Step S5313).

FIG. 356 is a flowchart of RF-ID proximity communication between the image capturing device 1 and the TV 45.

First, the second antenna 21 embedded in the image capturing device 1 receives weak radio power from polling of the RF-ID reader/writer 46 of the TV 45, and thereby activates the RF-ID unit 47 operated under the second power supply unit 91 (S5401).

The RF-ID unit 47 of the image capturing device 1, which is activated by receiving weak power at Step S5401, responds to the polling of the RF-ID reader/writer 46 of the TV 45 (Step S5402).

After responding to the polling at Step S5402, mutual authentication is performed to determine whether or not the RF-ID unit 47 of the image capturing device 1 and the RF-ID reader/writer 46 of the TV 45 are legitimate devices, and also to share a cryptography key used for secure information communication between the image capturing device 1 and the TV 45 (Step S5403). The mutual authentication employs a public key cryptography algorism such as elliptic curve cryptography. In general, the employed method for the mutual authentication is the same as that of mutual authentication used in communication via High Definition Multimedia Interface (HDMI) or IEEE1394.

As described earlier, at Step S5403, the mutual authentication is performed between the RF-ID unit 47 of the image capturing device 1 and the RF-ID reader/writer 46 of the TV 45 to generate a common cryptography key. After that, the server URL generation information 80 is read from the server specific information 58 stored in the second memory 52 readable from the RF-ID unit 47. The server URL generation information 80 is transmitted to the RF-ID reader/writer 46 of the TV 45 via the second antenna 21 (Step S5404). The server URL generation information 80 includes: the server address information 81 indicating address information of the server 42; the user identification information 82 that is the login ID 83 to the server 42; and the password 84 that is a login password to the server 42. The password 84 is important information for preventing unauthorized acts of a malicious third person. Therefore, the password 84 is sometimes encrypted beforehand as the encrypted password 85 to be stored, and then transmitted to the TV 45.

After the server URL generation information 80 is transmitted to the RF-ID reader/writer 46 of the TV 45 at Step S5404, the captured image state information 55 stored in the second memory 52 is also transmitted to the RF-ID reader/writer 46 of the TV 45 via the second antenna 21 (Step S5405). The captured image state information 55 is: the final capturing time 68 (case 1); the existence identifiers 64 which are existence identification information regarding images not yet uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

In case 1, the final capturing time 68 is used as the captured image state information 55. Therefore, the TV 45 compares the final capturing time 68 to the final upload time. If the final capturing time 68 is temporally later than the final upload time that is a time of finally uploading to the server 42, then it is determined that the image data in the image capturing device 1 is not in synchronization with the image data in the server 42. Therefore, warning information regarding the synchronization failure is displayed on the display unit of the TV 45.

In case 2, the captured image state information 55 is the existence identifiers 64 each of which is assigned to a corresponding one of the captured images so that it is possible to determine whether the image has not yet been uploaded. Therefore, the TV 45 examines the existence identifiers 64 to determine whether or not there is any image not yet uploaded. If there is any image not yet uploaded, then it is determined that the image data in the image capturing device 1 is not in synchronization with the image data in the server 42. Therefore, warning information regarding the synchronization failure is displayed on the display unit of the TV 45.

In case 3, the not-yet-uploaded image information hashed information 67 is employed as the captured image state information 55. Therefore, the TV 45 examines the not-yet-uploaded image information hashed information 67 to determine whether or not there is any image not yet uploaded. If there is any image not yet uploaded, then it is determined that the image data in the image capturing device 1 is not in synchronization with the image data in the server 42. Therefore, warning information regarding the synchronization failure is displayed on the display unit of the TV 45.

In case 4, the captured image state information 55 is the final image serial number 69 from among image serial numbers chronologically assigned to the captured images. Therefore, the TV 45 compares (a) the final image serial number 69 from among image serial numbers chronologically assigned to the captured images to (b) an image serial number of an image finally uploaded to the server 42. Here, the final image serial number 69 is provided from the image capturing device 1, while the image serial number is provided from the server 42. Based on the comparison, the TV 45 can determine whether or not there is any image not yet uploaded. If there is any image not yet uploaded, then it is determined that the image data in the image capturing device 1 is not in synchronization with the image data in the server 42. Therefore, warning information regarding the synchronization failure is displayed on the display unit of the TV 45.

After transmitting the captured image state information 55 from the second antenna 21 of the image capturing device 1 to the RF-ID reader/writer 46 of the TV 45 at Step S5405, the image display method instruction information 77 is also transmitted from the second memory 52 of the image capturing device 1 to the RF-ID reader/writer 46 of the TV 45 via the second antenna 21 (Step S5406). The image display method instruction information 77 is identification information indicating how the display unit of the TV 45 is to display the images downloaded from the server 42. The image display method instruction information 77 includes the list display (indicator) 78 indicating that the images are to be displayed in a list, and the slide show (indicator) 79 indicating that the images are to be displayed as a slide show.

As described above, at Steps S5401 to S5406, the image capturing device 1 transmits the server URL generation information 80, the captured image state information 55, and the image display method instruction information 77, which are stored in the second memory 52 of the image capturing device 1, from the second antenna 21 of the image capturing device 1 to the RF-ID reader/writer 46 of the TV 45. Here, it is desirable to encrypt all of the above pieces of information to be transmitted, by using the cryptography key information shared between the image capturing device 1 and the TV 45 at the mutual authentication. The encryption achieves secure information communication between the image capturing device 1 and the TV 45. As a result, intervention of a malicious third person can be prevented.

Since the server URL generation information 80 is transmitted to the TV 45, the server 42 (and directory) to which the first antenna 20 of the image capturing device 1 transmits data is the same as the server (and directory) from which the TV 45 downloads the data. Therefore, the TV 45 can display the images that have been captured by the image capturing device 1 and then uploaded to the server 42.

In addition, the transmission of the captured image state information 55 to the TV 45 makes it possible to examine synchronization between the captured images stored in the third memory 33 of the image capturing device 1 and the images uploaded from the first antenna 20 to the server 42. Therefore, the TV 45 can detect a failure of the synchronization. The display of the warning information indicating the synchronization failure on the TV 45 can prevent unnecessary confusion of the user.

Moreover, the transmission of the image display method instruction information 77 to the TV 45 enables the user to view images by a set image viewing method without designating the image viewing method on the TV 45. The user merely needs to move the image capturing device 1 into proximity of the TV 45. The complicated operations using a remote controller or the like of the TV 45 are not necessary. The images can be automatically displayed by the set viewing method.

FIG. 357 is a block diagram of characteristic functions of a TV system according to Embodiment A2 of the present invention.

The TV 45 according to Embodiment A2 includes the RF-ID reader/writer 46, the decryption unit 5504, a URL generation unit 5505, a communication unit 5506, a transmission unit 5507, a communication interface 5508, a receiving unit 5509, a data processing unit 5510, a memory unit 5511, a display unit 5512, and a CPU 5513.

The RF-ID reader/writer 46 communicates with the RF-ID unit 47 of the image capturing device 1 via the second antenna 21. The RF-ID reader/writer 46 includes a wireless antenna 5501, a receiving unit 5503, and a communicable device search unit (polling unit) 5502.

The wireless antenna 5501 performs proximity wireless communication with the second antenna 21 of the image capturing device 1. The wireless antenna 5501 has the same structure as that of wireless antennas of general-purpose RF-ID reader/writers.

The communicable device search unit (polling unit) 5502 performs polling to check a RF-ID unit of each of plural cameras in order to examine whether to have any transmission request (or processing request). If the communicable device search unit 5502 receives a response of the polling from the RF-ID unit 47 of the image capturing device 1 (the corresponding camera), then the mutual authentication is performed to share a common cryptography key between the TV 45 and the image capturing device 1.

When the mutual authentication is completed after receiving the polling response, the receiving unit 5503 receives the server URL generation information 80, the captured image state information 55, and the image display method instruction information 77 from the second memory 52 via the second antenna 21 of the image capturing device 1.

The decryption unit 5504 decrypts the server URL generation information 80, the captured image state information 55, and the image display method instruction information 77 which are received by the receiving unit 5503. The decryption of the server URL generation information 80, the captured image state information 55, and the image display method instruction information 77 which have been encrypted is performed using the cryptography key shared between the image capturing device 1 and the TV 45 after the mutual authentication by the communicable device search unit (polling unit) 5502.

The URL generation unit 5505 generates, based on the server URL generation information 80, a URL to access the server 42, and then transmits the generated URL to the communication unit. The URL includes not only the server specific information, but also the login ID 83 and the password 85 used to login to the server.

The communication unit 5506 communicates with the server 42 via a general-purpose network using the communication interface 5508.

The transmission unit 5507 transmits the URL generated by the URL generation unit 5505 via the communication interface 5508 in order to connect the TV 45 to the server 42.

The communication interface 5508 is a communication interface for connecting the TV 45 to the server 42 via a general-purpose network. The communication interface 5508 is, for example, a wired/wireless LAN interface.

The receiving unit 5509 receives (downloads) image data and an image display cascading style sheet (CSS) from the serer 42 connected by the communication interface 5508.

The data processing unit 5510 performs data processing for the image data downloaded by the receiving unit 5509. If the image data to be downloaded is compressed data, the data processing unit 5510 de-compresses the image data. If the image data is encrypted, the data processing unit 5510 decrypts the image data. In addition, the data processing unit 5510 can arrange the downloaded image data by an image display style based on the image display CSS. If it is determined, based on the captured image state information 55 obtained, if necessary, by decryption of the decryption unit, that the image data in the image capturing device 1 is not in synchronization with the image data in the server 42, then the data processing unit 5510 causes the display unit 5512 to display warning information regarding the synchronization failure. Thereby, unnecessary confusion of the user can be prevented. Moreover, the data processing unit 5510 sets a mode of displaying the downloaded image data, according to the image display method instruction information 77 provided from the decryption unit 5504. For example, if the list display (flag) 78 in the image display method instruction information 77 is ON, then the data processing unit 5510 generates a list of the downloaded images and provides the list to the memory unit 5511. If the slide show (flag) 79 in the image display method instruction information 77 is ON, then the data processing unit 5510 generates a slide show of the downloaded images and provides the slide show to the memory unit 5511.

The memory unit 5511 is a memory that temporarily holds the image data processed by the data processing unit 5510.

The display unit 5512 displays the image data stored in the memory unit 5511. The image data has been downloaded from the server 42 and applied with data processing by the data processing unit 5510 as described earlier.

As descried above, based on the server URL generation information 80, the captured image state information 55, and the image display method instruction information 77 which are received from the RF-ID unit 47 of the image capturing device 1, the TV 45 according to Embodiment A2 of the present invention can be connected to the server 42, then download the uploaded image data from the server 42, and display the downloaded image data on the display unit 5512. Thereby, the user does not need to do complicated processes of removing the third memory 33 such as a Secure Digital (SD) card or a flash memory from the image capturing device 1 and equipping the third memory 33 to a card reader of the TV 45 in order to view captured images. In Embodiment A2 of the present invention, the user can display and view captured image data, by simple operations of simply presenting the RF-ID unit 47 of the image capturing device 1 to the RF-ID reader/writer 46 of the TV 45 for proximity communication. Embodiment A2 of the present invention can provide a captured image viewing system by which even users who are not familiar with operations of digital devices can easily view image data.

FIG. 358 is a flowchart of RF-ID wireless proximity communication between the image capturing device 1 and the TV 45.

First, the communicable device search unit 5502 in the RF-ID reader/writer 46 of the TV 45 transmits a polling signal to search for the RF-ID unit 47 of the communicable image capturing device 1 (Step S5601).

When the image capturing device 1 receives the polling signal from the communicable device search unit 5502 in the RF-ID reader/writer 46 of the TV 45, the second power supply unit 91 is supplied with power to activate (operate) the RF-ID unit 47 (Step S5602). Here, at least the RF-ID unit 47, which can be operated under the second power supply unit 91, is activated. It is not necessary to activate all functions in the image capturing device 1.

When the activation of the RF-ID unit 47 of the image capturing device 1 is completed at Step S5602, the image capturing device 1 transmits a polling response for the polling to the RF-ID reader/writer 46 of the TV 45 via the second antenna 21 (Step S5603).

After the image capturing device 1 responds to the polling at Step S5603, the TV 45 receives the polling response by the wireless antenna 5501 of the RF-ID reader/writer 46 (Step S5604).

After receiving the polling response at Step S5604, the TV 45 determines whether or not the image capturing device 1 transmitting the polling response is a device mutually communicable with the TV 45 (Step S5605). If the determination is made that the image capturing device 1 cannot mutually communicate with the TV 45, then the processing is completed. On the other hand, if the determination is made that the image capturing device 1 is mutually communicable with the TV 45, then the processing proceeds to Step S5606.

If the determination is made that the image capturing device 1 is mutually communicable with the TV 45 at Step S6505, then the TV 45 performs mutual authentication to determine whether or not the image capturing device 1 and the TV 45 are legitimate devices for communication (Step S5606). The mutual authentication is the same as general mutual authentication using HDMI or IEEE1394. In the mutual authentication, issuing of challenge data and checking of response data are performed plural times between the TV 45 and the image capturing device 1 to eventually generate a common cryptography key. If one of the TV 45 and the image capturing device 1 is not legitimate, the common cryptography key is not generated, thereby disabling future mutual communication.

The image capturing device 1 also performs the same mutual authentication in the RF-ID unit 47. Generation and transmission of challenge data and receiving and checking of response data are performed plural times between the TV 45 and the image capturing device 1 to eventually generate a cryptography key identical to the cryptography key generated by the TV 45 (Step S5607).

When the mutual authentication is completed at Step S5607, the image capturing device 1 reads the server URL generation information 80 as the server specific information 58 from the second memory 52, then encrypts the server URL generation information 80 using the common cryptography key generated at the mutual authentication, and transmits the encrypted server URL generation information 80 to the RF-ID reader/writer 46 of the TV 45 (Step S5608).

The TV 45 receives the encrypted server URL generation information 80 transmitted at Step S5608, by the receiving unit 5503 in the RF-ID reader/writer 46. Then, the decryption unit 5504 decrypts the encrypted server URL generation information 80 using the common cryptography key. Based on the server URL generation information 80, the URL generation unit 5505 generates a URL to access the server 42. Then, the TV 45 transmits, to the image capturing device 1, a notification of completion of receiving the server URL generation information 80 (Step S5609).

After the notification of the receiving completion is transmitted at Step S5609, the image capturing device 1 receives the notification by the second antenna 21. Then, the image capturing device 1 reads the captured image state information 55 from the second memory 52 to transmit the captured image state information to the TV 45 (Step S5610). The captured image state information 55 is: the final capturing time 68 (case 1); the existence identifiers 64 which are existence identification information regarding images not yet uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

After the image capturing device 1 transmits the captured image state information 55 at Step S5610, the TV 45 receives the captured image state information 55 by the RF-ID reader/writer 46 and then transmits, to the image capturing device 1, a notification of completion of receiving the captured image state information 55 (Step S5611). Here, the CPU 5513 in the TV 45 performs the following processing depending on kinds of the received captured image state information 55.

In case 1, the final capturing time 68 is used as the captured image state information 55. Therefore, the TV 45 compares the final capturing time 68 to the final upload time that is a time of finally uploading to the server 42. If the final capturing time 68 is temporally later than the final upload time, then it is determined that the image data in the image capturing device 1 is not in synchronization with the image data in the server 42. Therefore, warning information regarding the synchronization failure is displayed on the display unit of the TV 45.

In case 2, the captured image state information 55 is the existence identifiers 64 each of which is assigned to a corresponding one of the captured images so that it is possible to determine whether the image has not yet been uploaded. Therefore, the TV 45 examines the existence identifiers 64 to determine whether or not there is any image not yet uploaded. If there is any image not yet uploaded, then it is determined that the image data in the image capturing device 1 is not in synchronization with the image data in the server 42. Therefore, warning information regarding the synchronization failure is displayed on the display unit of the TV 45.

In case 3, the not-yet-uploaded image information hashed information 67 is employed as the captured image state information 55. Therefore, the TV 45 examines the not-yet-uploaded image information hashed information 67 to determine whether or not there is any image not yet uploaded. If there is any image not yet uploaded, then it is determined that the image data in the image capturing device 1 is not in synchronization with the image data in the server 42. Therefore, warning information regarding the synchronization failure is displayed on the display unit of the TV 45.

In case 4, the captured image state information 55 is the final image serial number 69 from among image serial numbers chronologically assigned to the captured images. Therefore, the TV 45 compares (a) the final image serial number 69 from among image serial numbers chronologically assigned to the captured images to (b) an image serial number of an image finally uploaded to the server 42. Here, the final image serial number 69 is provided from the image capturing device 1, while the image serial number is provided from the server 42. Based on the comparison, the TV 45 can determine whether or not there is any image not yet uploaded. If there is any image not yet uploaded, then it is determined that the image data in the image capturing device 1 is not in synchronization with the image data in the server 42. Therefore, warning information regarding the synchronization failure is displayed on the display unit of the TV 45.

After the TV 45 completes receiving of the captured image state information 55 and transmits the notification of the receipt to the image capturing device 1 at Step S5611, the image capturing device 1 reads the image display method instruction information 77 from the second memory 52 and transmits the image display method instruction information 77 to the TV 45 (Step S5612). The image display method instruction information 77 includes the list display (flag) 78 and the slide show display (flag) 79.

After the image display method instruction information 77 is transmitted at Step S5612, the TV 45 receives the image display method instruction information 77 by the RF-ID reader/writer 46 of the TV 45 and transmits a notification of completion of receiving the image display method instruction information 77 to the image capturing device 1 (Step S5613). The data processing unit 5510 of the TV 45 generates a mode of displaying images downloaded from the server 42, based on the received image display method instruction information 77. For example, if the list display flag in the image display method instruction information 77 is ON, the data processing unit 5510 generates a list of the downloaded images and stores the generated list in the memory unit 5511 and causes the display unit 5512 to display the list. On the other hand, if the slide show flag in the image display method instruction information 77 is ON, the data processing unit 5510 generates a slide show of the downloaded images and stores the generated slide show in the memory unit 5511 and causes the display unit 5512 to display the slide show.

After receiving the image display method instruction information 77 at Step S5613, the TV 45 disconnects communication from the RF-ID unit 47 of the image capturing device 1 (Step S5614).

Next, the TV 45 activates a TV system (Step S5615). The activation of the TV system refers to turning the main power of the TV 45 ON to display the downloaded image data on the display unit 5512. Prior to the activation of the TV system at Step S5615, at least the RF-ID reader/writer 46 of the TV 45 is activated and the display unit 5512 may be turned OFF.

Then, the communication unit 5506 is activated to connect the TV 45 to the server 42 based on the URL generated by the URL generation unit 5505 (Step S5616).

After connecting to the server 42 at Step S5616, the TV 45 downloads uploaded image data from the server 42 (Step S5617).

The data processing unit 5510 generates to-be-displayed image data from the images downloaded at the Step S5617, based on the image display method instruction information 77 obtained from the camera (the image capturing device 1), then stores the generated image data into the memory unit 5511, and displays the image data on the display unit 5512 (Step S5618). The data processing unit 5510 of the TV 45 generates a mode of displaying the images (image data) downloaded from the server 42, based on the received image display method instruction information 77. For example, if the list display flag 78 in the image display method instruction information 77 is ON, the data processing unit 5510 generates a list of the downloaded images and stores the generated list in the memory unit 5511 and causes the display unit 5512 to display the list. On the other hand, if the slide show display flag 79 in the image display method instruction information 77 is ON, the data processing unit 5510 generates a slide show of the downloaded images and stores the generated slide show in the memory unit 5511 and causes the display unit 5512 to display the slide show.

After displaying of the images downloaded from the server 42 is completed at Step S5617, the TV 45 performs synchronization examination to determine whether or not the captured images recorded in the third memory 33 of the image capturing device 1 are in synchronization with the images downloaded from the server 42 (Step S5619). The synchronization examination is performed based on the captured image state information provided at Step S5611 from the image capturing device 1. The captured image state information 55 is: the final capturing time 68 (case 1); the existence identifiers 64 which are existence identification information regarding images not yet uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

FIG. 359 (FIGS. 359A and 359B) is a flowchart of details of the server synchronization examination (Step S5619) of FIG. 358 when the captured image state information 55 are cases 1 to 4.

As noted above, the whole drawing including FIGS. 359A and 359B is simply referred to as "FIG. 359" when necessary.

Case 1 relates to a flowchart when the captured image state information 55 is the final capturing time 68.

First, the communication unit 5506 of the 45 receives, from the server 42, date/time of finally uploading to the server 42 (hereinafter, referred to also as a "final upload date/time" that may be date/time of capturing a final image among uploaded images to produce the same advantages) (Step S5701).

Next, the TV 45 compares the final upload date/time to a final capturing date/time 68 (Step S5702). The final capturing date/time 68, which is date/time of final capturing of the image capturing device 1, is indicated in the captured image state information 55 provided from the image capturing device 1 to the RF-ID reader/writer 46. If the final upload date/time is prior to the final capturing date/time 68, it is determined that there is an image captured after the final upload and not yet uploaded to the server 42. Therefore, a determination is made that the images in the image capturing device 1 are not in synchronization with the images in the server 42. Then, warning information is displayed at Step S5703. On the other hand, if the final upload date/time is equal to the final capturing date/time 68, it is determined that the images in the image capturing device 1 are in synchronization with the images in the server 42. Then, the synchronization examination is completed without displaying warning information.

If it is determined at Step S5702 that the images in the image capturing device 1 are not in synchronization with the images in the server 42, the display unit 5512 displays warning information indicating the synchronization failure. Here, if time information is generated by comparing the final upload date/time to the final capturing date/time 68 in order to indicate from when captured images are not uploaded, and the generated time information is presented as a message together with the warning information, the warning information is convenient for the user.

Case 2 relates to a flowchart when the captured image state information 55 is the existence identifiers 64 each of which is assigned to a corresponding one of the captured images so that it is possible to determine whether the image has not yet been uploaded.

First, it is determined, based on the existence identifiers of the not-yet-uploaded image existence identification information, whether or not there is any image not yet uploaded to the server 42 from among the captured images stored in the third memory 33 of the image capturing device 1 (Step S5711). Here, the existence identifiers are indicated in the captured image state information 55 provided from the image capturing device 1 to the RF-ID reader/writer 46. If it is determined that there is an image not yet uploaded to the server 42 at Step S5711, then the processing proceed to Step S5712 to display warning information. On the other hand, if there is not image not yet uploaded, it is determined that the images in the image capturing device 1 are in synchronization with the images in the server 42. Then, the synchronization examination is completed without displaying warning information.

If it is determined that the images in the image capturing device 1 are not in synchronization with the images in the server 42, the display unit 5512 displays warning information indicating the synchronization failure at Step S5712.

Case 3 relates to a flowchart when the captured image state information 55 is the not-yet-uploaded image information hashed information 67.

First, it is determined, based on the not-yet-uploaded image information hashed information 67, whether or not there is any image not yet uploaded to the server 42 from among the captured images stored in the third memory 33 of the image capturing device 1 (Step S5721). Here, the not-yet-uploaded image information hashed information 67 is indicated in the captured image state information 55 provided from the image capturing device 1 to the RF-ID reader/writer 46. The determination of Step S5721 is performed by comparing the not-yet-uploaded image information hashed information 67 to a hashed value generated by hashing NULL generated in the TV 45. If it is determined that there is an image not yet uploaded at Step S5721, then the processing proceed to Step S5722 to display warning information. On the other hand, if there is no image not yet uploaded, it is determined that the images in the image capturing device 1 are in synchronization with the images in the server 42. Then, the synchronization examination is completed without displaying warning information.

If it is determined that the images in the image capturing device 1 are not in synchronization with the images in the server 42, the display unit 5512 displays warning information indicating the synchronization failure at Step S5722.

Case 4 relates to a flowchart when the captured image state information 55 is a final image serial number from among image serial numbers assigned to captured images.

First, the communication unit 5506 of the TV 45 receives, from the server 42, an image serial number of an image finally uploaded to the server 42 (Step S5731).

Next, the TV 45 compares (a) the image serial number 69 of the image finally uploaded which is provided form the server 42 to (b) a final image serial number 69 of an image finally captured which is indicated in the captured image state information 55 provided from the image capturing device 1 by the RF-ID reader/writer 46 (Step S5732). If the mage serial number 69 of the image finally uploaded is smaller than the mage serial number 69 of the image finally captured, it is determined that there is an image captured after the final upload and not yet uploaded to the server 42. Therefore, a determination is made that the images in the image capturing device 1 are not in synchronization with the images in the server 42. Then, the processing proceeds to Step S5733 to display warning information. On the other hand, if the mage serial number 69 of the image finally uploaded is identical to the mage serial number 69 of the image finally captured, it is determined that the images in the image capturing device 1 are in synchronization with the images in the server 42. Then, the synchronization examination is completed without displaying warning information.

If it is determined at Step S5732 that the images in the image capturing device 1 are not in synchronization with the images in the server 42, the display unit 5512 displays warning information indicating the synchronization failure.

When all of images captured by the image capturing device 1 are not uploaded to the serve 42 (in other words, when images captured by the image capturing device 1 are not in synchronization with images uploaded to the server 42), any of above cases 1 to 4 makes it possible to detect the synchronization failure. Thereby, although all of the captured images cannot be displayed on the display unit 5512, a convenient message can be displayed to the user to inform the synchronization failure. As a result, unnecessary confusion of the user can be prevented.

FIG. 360 shows (1) a data format used in uploading captured images from the image capturing device 1 to the server 42, and (2) a data format used in RF-ID communication between the image capturing device 1 and the TV 45.

First, (1) a data format 5940 in uploading captured images from the image capturing device 1 to the server 42 is described. The data format 5940 includes camera ID 5901, a sever address 5902, a server login ID 5903, a server login password 5904, an image directory 5905, and an uploading-image number 5906.

The camera ID 5901 is camera UID uniquely assigned to each camera (image capturing device 1). The camera ID 5901 is ID information recorded in the camera ID 76 in the second memory 52 of the image capturing device 1. Use of the camera ID 5901 as login ID to the server 42 can provide a server address unique to each image capturing device 1 so that the image capturing device 1 can access the server 42 without user's entry of login ID. In addition, the camera ID 5901 enables the server 42 to manage captured images for each capturing camera.

The sever address 5902 is included in the server address information 81 in the server specific information 58 stored in the second memory 52 of the image capturing device 1. The sever address 5902 enables the TV 45 to identify the server to which target image data is uploaded.

The server login ID 5903 is included in the login ID 83 in the user identification information 82 in the server specific information 58 stored in the second memory 52 of the image capturing device 1. The server login ID 5903 allows the TV 45 to login, by using the same account, to the server to which the image capturing device 1 uploads image data.

The server login password 5904 is included in the password 84 in the server specific information 58 stored in the second memory 52 of the image capturing device 1. The server login password 5904 allows the TV 45 to login, by using the same account, to the server to which the image capturing device 1 uploads image data.

The uploading-image number 5906 is the number of images to be uploaded to the server. The uploading-image number 5906 is equal to the number of images which is stored as the not-yet-uploaded-image number 65 in the second memory 52 of the image capturing device 1. After capturing images, the number of images not yet uploaded is indicated in the uploading-image number 5906.

After transmitting the data format 5940, the image capturing device 1 uploads, to the server 42, the images that are stored in the third memory 33 of the image capturing device 1 but have not yet been uploaded to the server 42.

Next, (2) a data format 5950 used in RF-ID communication between the image capturing device 1 and the TV 45 is described. The data format 5950 includes camera ID 5911, a sever address 5912, a server login ID 5913, a server login password 5914, a final capturing date/time (final capturing time) 5915, and not-yet-uploaded image data existence identifiers 5916, not-yet-uploaded image information hashed information 5917, a final image serial number 5918, and image display method instruction information 5919.

The camera ID 5911 is a camera UID uniquely assigned to each camera (image capturing device 1). The camera ID 5911 is ID information recorded in the camera ID 76 in the second memory 52 of the image capturing device 1. Use of the camera ID 5911 as login ID to the server 42 from the TV 45 can provide a server address unique to each image capturing device 1 so that the TV 45 can access the server 42 without user's entry of login ID. The camera ID 5901 may be used in the mutual authentication between the RF-ID unit 47 of the image capturing device 1 and the RF-ID reader/writer 46 of the TV 45.

The sever address 5912 is included in the server address information 81 in the server specific information 58 stored in the second memory 52 of the image capturing device 1. The sever address 5912 enables the TV 45 to identify the server to which target image data is uploaded.

The server login ID 5913 is included in the login ID 83 in the user identification information 82 in the server specific information 58 stored in the second memory 52 of the image capturing device 1. The server login ID 5913 allows the TV 45 to login, by using the same account, to the server to which the image capturing device 1 uploads image data.

The server login password 5914 is included in the password 84 in the server specific information 58 stored in the second memory 52 of the image capturing device 1. The server login password 5914 allows the TV 45 to login, by using the same account, to the server to which the image capturing device 1 uploads image data.

The final capturing date/time 5915 corresponds to the final capturing time 68 in the captured image state information 55 stored in the second memory 52 of the image capturing device 1. The TV 45 uses the final capturing date/time 5915 for the synchronization examination between captured images in the image capturing device 1 and captured images in the server 42.

The not-yet-uploaded image data existence identifiers 5916 correspond to the not-yet-uploaded image data existence identification information in the captured image state information 55 stored in the second memory 52 of the image capturing device 1. TV 45 uses the not-yet-uploaded image data existence identifiers 5916 for the synchronization examination between captured images in the image capturing device 1 and captured images in the server 42. In order to implement each of the not-yet-uploaded image data existence identifiers 5916, each image ID 5928 for identifying a corresponding one of captured images is assigned with an upload flag 5926 indicating whether or not the corresponding image has been uploaded to the server 42. Thereby, it is possible to determine whether or not each of the captured images has been uploaded to the server 42.

The not-yet-uploaded image information hashed information 5917 corresponds to the not-yet-uploaded image information hashed information 67 in the captured image state information 55 stored in the second memory 52 of the image capturing device 1. The TV 45 uses the not-yet-uploaded image information hashed information 5917 for the synchronization examination between captured images in the image capturing device 1 and captured images in the server 42.

The final image serial number 5918 corresponds to the final image serial number 69 in the captured image state information 55 stored in the second memory 52 of the image capturing device 1. The TV 45 uses the final image serial number 5918 for the synchronization examination between captured images in the image capturing device 1 and captured images in the server 42.

The image display method instruction information 5919 corresponds to the image display method instruction information 77 in the captured image state information 55 stored in the second memory 52 of the image capturing device 1. The image display method instruction information 5919 includes identification information by which the TV 45 designates a method of viewing images downloaded from the server 42.

For each image ID 5927, the image display method instruction information 5919 includes a list display flag 5920, a slide show flag 5921, a print flag 5922, a video reproduction flag 5923, a download flag 5924, and a security password 5925.

The image ID 5927 is information unique to a captured image. The pieces of image ID 5927 are chronologically assigned to captured images by the image capturing device 1 in capturing the images.

The list display flag 5920 corresponds to the list display (flag) 78 stored in the second memory 52 of the image capturing device 1. The TV 45 uses the list display flag 5920 to determine whether or not image data downloaded from the server 42 is to be displayed in a list format. If the list display flag 5920 indicates "yes", the data processing unit 5510 of the TV 45 generates a list of the downloaded images, stores the list to the memory unit 5511, and then displays the list on the display unit 5512.

The slide show flag 5921 corresponds to the slide show (flag) 79 stored in the second memory 52 of the image capturing device 1. The TV 45 uses the slide show flag 5921 to determine whether or not image data downloaded from the server 42 is to be displayed as a slide show. If the slide show flag 5921 indicates "automatic", the data processing unit 5510 of the TV 45 generates a slide show of the downloaded images, stores the slide show to the memory unit 5511, and then displays the slide show on the display unit 5512. If the slide show flag 5921 indicates "manual", the TV 45 permits execution of the slide show according to instructions from the user. If the slide show flag 5921 indicates "disable", the TV 45 inhibits display of the slide show.

The print flag 5922 indicates whether or not images to be downloaded to the TV 45 and then displayed on the display unit 5512 are permitted to be printed by a printer (not shown) connected to the TV 45. The print flag 5922 is not shown in the image display method instruction information 77 stored in the second memory 52 of the image capturing device 1. However, if the print flag 5922 is added, it is possible to set whether or not image data is printable. As a result, usability related to use of images can be improved.

The video reproduction flag 5923 indicates whether or not video data captured by the image capturing device 1 and then uploaded to the server 42 is permitted to be downloaded by the TV 45 and then viewed. If the image capturing device 1 has a video capturing function, addition of the video reproduction flag 5923 to the image display method instruction information 77 stored in the second memory 52 can add setting of whether or not video reproduction is permitted. As a result, the video reproduction can be managed without complicated operations by the user.

The download flag 5924 is an identifier indicating whether or not image or video uploaded to the server 42 is permitted to be downloaded (copied) to a memory in the TV 45. The download flag 5924 can prevent that the image or video is copied by the third person to which image capturing is not permitted. Thereby, copy-right protection is also achieved.

The security password 5925 is password information that permits only the authorized user to perform the above-described image viewing, printing, and downloading processes. In Embodiment A2, the same password is set for each of the above-described image viewing, printing, and downloading processes. It is preferable, however, to set a different password to each of image viewing, printing, and downloading processes, so that a level of security can be set independently.

As described above, in the system according to Embodiment A2 of the present invention, the image capturing device 1 uploads captured images to the server connected to the image capturing device 1 via the first antenna. When the image capturing device 1 is prevented to the RF-ID reader/writer 46 of the TV 45, the image capturing device 1 transmits the server URL generation information 80, the captured image state information 55, and the image display method instruction information 77 from the RF-ID unit 47 to the TV 45 by the RF-ID communication. Then, the TV 45 connects to the server to which the image capturing device 1 has uploaded the captured images, then downloads the captured images from the server, and displays the captured images. Here, it is determined whether or not the captured images in the server 42 are in synchronization with the captured images in the image capturing device 1. If the synchronization is failure, the TV 45 displays notification of the synchronization failure on the display unit 5512. Thereby, the user can display the captured images only by presenting the image capturing device 1 to the TV 45, although the user conventionally has to remove a recording memory from the camera (the image capturing device 1) to be equipped to the TV 45 in order to view the images. Thereby, even the user who is not familiar with operations of digital devices can easily display the images on the TV 45.

[Embodiment A3]

Embodiment A3 of the present invention is described below.

First, Embodiment A3 is explained in summary.

FIG. 361 is a schematic block diagram of an electronic catalog display system according to Embodiment A3.

The electronic catalog display system according to Embodiment A3 includes an electronic catalog server information input device 500, an electronic catalog notification card 502, the TV 45, and an electronic catalog server 506. The electronic catalog server information input device 500 includes a RF-ID writer 501. The electronic catalog notification card 502 includes a RF-ID unit 47. The TV 45 includes a RF-ID reader 504 and a network communication unit 509$x$. The electronic catalog server 506 includes an electronic catalog database 507 and a customer attribute database 508.

The electronic catalog server information input device 500 writes electronic catalog server information from the RF-ID writer 501 to the RF-ID unit 47 attached to the electronic catalog notification card 502. The electronic catalog server information is provided from a user who provides services of an electronic catalog (hereinafter, referred to as a "provider user"). When a user who receives the services of the electronic catalog (hereinafter, referred to as a "customer user") brings the electronic catalog notification card 502, in which the electronic catalog server information is written, into proximity of the TV 45, the RF-ID reader 504 in the TV 45 reads the electronic catalog server information from the RF-ID unit 47. In addition, the TV 45 transmits, based on the readout electronic catalog server information, a request for obtaining an electronic catalog to the electronic catalog server 505 set on a network via the network communication unit (communication unit) 509. Furthermore, when transmitting the request to the electronic catalog server, the TV 45 transmits also user information, which is previously inputted in the TV 45, to the electronic catalog server 505. The electronic catalog server 505 receives the request for the electronic catalog and the user information from the TV 45. First, the electronic catalog server 505 obtains customer attribute data from the customer attribute database 508 based on the user information. Next, from the electronic catalog database 507, the electronic catalog server 506 obtains electronic catalog data associated with the customer attribute data. Then, the electronic catalog server 505 transmits the obtained electronic catalog data to the TV 45 from which the request for the electronic catalog has been transmitted. The TV 45 displays the electronic catalog data received from the electronic catalog server 505, and thereby receives purchase operations from the customer user to purchase products in the electronic catalog data.

The following describes the electronic catalog display system according to Embodiment A3 in more detail.

FIG. 362 is a functional block diagram illustrating a structure of the electronic catalog server information input device according to Embodiment A3.

First, a key input receiving unit 520 receives an input by input keys operated by the provider user, in order to obtain the electronic catalog server information. The electronic catalog server information obtained by the key input receiving unit 520 includes: a sever address such as a URL; server login ID; a server login password; an electronic catalog display password; electronic catalog display information; and a medium identification information. The electronic catalog display information indicates whether images of products/services in the electronic catalog are to be displayed in a list (as thumbnails) or sequentially (as a slide show). The medium identification information is used for identifying a medium such as a card or a postcard to which RF-ID is attached. The electronic catalog server information obtained by the key input receiving unit 520 is stored into a storage unit 522. Next, when a RF-ID transmission key and the like are received after receiving of the electronic catalog server information, a RF-ID transmission input receiving unit 521 notifies a transmission unit 523 of a transmission request. Then, the transmission unit 523 reads the electronic catalog server information from the storage unit 522. An antenna unit 524 transmits the electronic catalog server information.

FIG. 363 is a flowchart of steps of processing performed by the electronic catalog server information input device.

The processing performed by the electronic catalog server information input device is presented in more detail with reference to a flowchart of FIG. 363.

FIG. 364 is a block diagram of a structure of the RF-ID unit 47 included in the electronic catalog notification card 502.

A structure and processing of the RF-ID unit 47 are the same as those described in Embodiments A1 and A2. The second power supply unit 91 obtains current from signals received by the second antenna 21, and provides power to each unit in the electronic catalog notification card 502. Received information is recorded into the second memory 52 via the data receiving unit 105, the second processing unit 95, and the recording unit 106.

FIG. 365 is a functional block diagram of a structure of the TV 45.

The structure of the TV 45 according to Embodiment A3 differs from the structure of the TV 45 according to Embodiment A2 in that a user information input unit 588 is added. The user information input unit 588 receives the user information and stores the user information into a memory unit 583 temporarily. The user information is an attribute of the customer user and previously inputted by the customer user himself/herself. The user information is preferably gender or age information of the customer user. The user information may be other information, such as a residence or a family structure, which is private information for selecting product/service data in the electronic catalog. The user information is transmitted to the electronic catalog server via the communication unit 509, together with the URL of the electronic catalog server generated by the URL generation unit. In the same manner as described in Embodiment A1, in Embodiment A3, when the customer user moves the electronic catalog notification card 502 into proximity of a RF-ID reader 504 of the TV 45, the TV 45 receives the electronic catalog server information and thereby generates a URL of the server to connect to the server. The details of this processing are the same as those described in Embodiment A1 with reference to FIGS. 320 to 333.

FIG. 366 is a functional block diagram of a structure of the electronic catalog server 506.

FIG. 367 is a flowchart of steps of processing performed by the electronic catalog server.

FIG. 370 is a table of a data structure of a customer attribute database.

FIG. 371 is a table of a data structure of an electronic catalog database.

The electronic catalog server 506 receives an electronic catalog destination address and the user information from the TV 45 via a communication unit 600. The electronic catalog destination address is a network address of the TV 45 on a network to which the TV 45 and the electronic catalog server 506 belong. Next, based on the user information received by the customer attribute data obtainment unit, the electronic catalog server 506 obtains customer attribute data from the customer attribute database 508. For instance, if the user information includes a gender and an age of the customer user using the TV 45, the electronic catalog server 506 obtains, as the customer attribute data, information of a product/service genre and a product/service price range which are in association with the age and gender of the customer user, based on the customer attribute database 508 having a data structure illustrated in FIG. 370. Then, the electronic catalog data obtainment unit 602 obtains the electronic catalog data from the electronic catalog database 507 based on customer attribute data. For example, if the customer attribute data includes product/service genres and product/service price ranges, the electronic catalog server 506 obtains, as the electronic catalog data, all of product/service data corresponding to the product/service genres and the product/service price ranges, from the electronic catalog database 507 having a data structure illustrated in FIG. 371. The electronic catalog server 506 transmits the electronic catalog data obtained by the electronic catalog data obtainment unit 602 to the TV having the electronic catalog destination address, via a communication unit 600.

The processing performed by the electronic catalog server 506 is presented in more detail in a flowchart of FIG. 367.

FIG. 368 is a flowchart of steps of processing performed by a TV displaying the electronic catalog.

The following describes processing of the TV 45 after downloading the electronic catalog data, with reference to a flowchart of FIG. 368. The processing regarding obtaining of the electronic catalog server information from the RF-ID unit at Steps S630 to S632 is the same whichever the electronic catalog data is downloaded or not. At S633, it is determined whether or not the electronic catalog data associated with the electronic catalog server information received from the RF-ID unit has already been downloaded and displayed. If the electronic catalog data has not yet been downloaded, then the TV 45 downloads the electronic catalog data from the server at S634 and displays the electronic catalog data at S635. The download processing is the same as the download processing described in Embodiment A1.

FIG. 369 is a diagram illustrating screen display of the electronic catalog.

If it is determined at S633 that the electronic catalog data has already been downloaded, then the TV 45 issues a signal of a predetermined key (for example, a signal of a Decide key) to execute operations for the displayed electronic catalog data. Here, as illustrated in an example of a screen display of the electronic catalog data in FIG. 369, a screen presents the customer user with a few of options for a next operation to be executed by the customer user for the displayed electronic catalog data. Then, a focus circulates among the options on the screen (as illustrated as options 652 and 653 in FIG. 369) to indicate one of them as a selection candidate every time a predetermined time period passes. This allows the customer user to execute an operation for selecting or purchasing each product in the electronic catalog data, for example, only by presenting the electronic catalog notification card 502 having the RF-ID unit 47 to the TV 45, when the focus indicates a desired option of the customer user.

The second memory 52 according to Embodiment A3, which is embedded in the RF-ID unit 47 on the electronic catalog notification card 502, may be a Read Only Memory (ROM). In this aspect, the electronic catalog server information input device 500 serves as a RF-ID memory data input unit in manufacturing the RF-ID unit, or a RF-ID memory data input means in a RF-ID manufacturing system. In general, a RF-ID unit having a ROM unit is inexpensive more than a RF-ID unit having a rewritable memory. Therefore, the RF-ID unit having a ROM allows the provider user sending a great number of electronic catalog notification cards to reduce a cost.

It should be noted that it has been described in Embodiment A3 that a focus circulates among the options on the screen of the TV 45 (as illustrated as options 652 and 653 in FIG. 369) to indicate one of them as a selection candidate every time a predetermined time period passes. However, the method of operating the electronic catalog data displayed on the screen by using the electronic catalog notification card 502 having the RF-ID unit 47 is not limited to the above. For example, it is also possible that the receiving unit 571 of the TV 45 sequentially receive pieces of information from the RF-ID unit and counts the sequential receiving processes, then thereby calculates a time period (RF-ID proximity time period) during which the RF-ID unit is in proximity of the TV 45, and eventually moves a focus indicating a selection candidate displayed on the screen based on the RF-ID proximity time period. With the above structure, the following operation for the electronic catalog is possible. Only when the RF-ID unit is in proximity of the TV, the focus displayed on the screen is circulated to change the selection candidate. If the RF-ID unit is away from the TV, the focus is stopped. After a predetermined time period after stopping of the focus, the selection candidate on which the focus is stopped is decided as selection. In this operation for the electronic catalog, the customer user can actively operate the electronic catalog by using the RF-ID unit, without waiting for the focus, which automatically circulates among options every predetermined time period, to arrive at a user's desired option.

It should also be noted that it has been described in Embodiment A3 that the electronic catalog server information input device 500 has the key input receiving unit 520 which receives inputs by the input keys operated by the provider user in order to obtain the electronic catalog server information. However, the following configuration is also possible. That is, the electronic catalog server information input device 500 has a communication interface to communicate with the image server. The image server holds the server information to be transmitted to the electronic catalog server information input device 500. The electronic catalog server information input device 500 receives the server information from the image server, in order to obtain the server information. This configuration in which the server information is stored in the image server allows the electronic catalog server information input device 500 to eliminate inputting to the image server. Especially, when a plurality of the electronic catalog server information input devices 500 are operated for a single image server, this configuration is highly convenient.

The conventional techniques have a program that users who are not familiar with operations of digital devices such as personal computers should learn operations of the devices to do online shopping. However, the system according to Embodiment A3 enables users using electronic catalogs to do online shopping and the like, simply by bringing received cards or post cards into proximity of TVs. Therefore, even users who are not familiar with online terminals such as personal computers and mobile phones can easily enjoy shopping on TV screens.

[Embodiment A4]

Embodiment A4 of the present invention is described below.

FIG. 372 is a schematic diagram of Embodiment A4.

In Embodiment A4, it is described a method of sending, to a remote location, a post card attached with RF-ID used to access an image server. First, a first user, who is a sender of a post card, brings the image capturing device 1 having the RF-ID unit 47 into proximity of the RF-ID reader/writer 46 of the TV 45. Thereby, the TV 45 generates a server URL used to connect the TV 45 to the image server 42, thereby obtains image data from the image server 42, and eventually displays the image data on a screen. This processing is the same as described in Embodiment A1. Next, by using an input means such as a remote controller of the TV 45, the first user selects an image(s) to be printed on a post card and images to be registered in association with the post card (in other words, images to be shown to a second user living in a remote location), from among the image data displayed by the TV 45. In addition, the first user inputs address information such as a destination address of the post card by using the remote controller or the like. The TV 45 transmits, to the image server 42, ID of the image selected by the first user to be printed on the post card (hereinafter, referred to as "print image ID"), ID of the images to be registered for the post card (hereinafter, referred to as "registration image ID"), and the destination information of the post card (hereinafter, referred to as "post card destination information"). The image server 42 retrieves the image data identified by the print image ID and then transmits the image data and the post card destination information to a printer 800. The printer 800 prints the image data and the post card destination information on the post card. In addition, to the image server information input unit 500x, the image server 42 transmits the registration image ID received from the TV 45, together with image server information. The image server information includes: a sever address such as a URL; server login ID; a server login password; an image display password, image display information indicating whether the image data (images) is to be displayed in a list (as thumbnails) or sequentially (as a slide show); and medium identification information indicating a medium, such as a card or post card, to which RF-ID is to be attached. An image server information input device 500x writes the image server information and the registration image ID to the RF-ID unit 47 of the post card on which the image and the destination information are printed by the printer 800. The post card 801 applied with printing and RF-ID writing is mailed to the printed destination. Thereby, the second user, who is designated by the first user as being the destination, receives the post card 801. When the second user brings the mailed post card 801 into proximity of a RF-ID reader/writer 46 of a TV 45 of the second user, the TV 45 of the second user obtains the image server information and the registration image ID from the RF-ID unit 47, downloads the images identified by the registration image ID, and displays the downloaded images.

The structure and processing of the image capturing device 1 according to Embodiment A4 are the same as described in Embodiment A1.

FIG. 373 is a block diagram of a structure of the TV 45 according to Embodiment A4.

A receiving unit 811 receives the image server information from the RF-ID unit 47 of the image capturing device 1 or the post card 801 via a wireless antenna 570. If the RF-ID unit 47 of the post card 801 holds the registration image ID, the receiving unit 811 receives also the registration image ID. An image selection unit 584 receives an image selection operation from the user via a key unit 585 and an infrared ray receiving unit 586, and thereby obtains ID of an image which the first user has selected to be printed on the post card (namely, the print image ID) and ID of images which the first user has selected to be registered for the post card (namely, the registration image ID). Then, the image selection unit 584 provides the obtained IDs to the communication unit 509.

FIG. 374 is a diagram illustrating screen display in image selection operation by the RF-ID-attached post card mailing system.

FIG. 374 illustrates an example of a screen display on the TV 45 in the image selection operation. In FIG. 374, 821 is a screen display from which the first user selects an image to be printed on the post card. 820 in FIG. 374 is a screen display from which the first user selects images to be registered for the post card. A post card destination information input unit 810 receives a character input operation of the first user via the key unit 585 and the infrared ray receiving unit 586. Thereby, the post card destination information input unit 810 obtains the post card destination information including an address and a name of the destination of the post card. Then, the post card destination information input unit 810 provides the post card destination information to the communication unit 509. 823 in FIG. 374 is an example of a screen display on which the post card destination information is inputted. The communication unit 509 transmits the post card destination information, the print image ID, and the registration ID to the image server via a transmission unit 575 and a communication interface 576.

FIG. 375 is a flowchart of processing performed prior to mailing of the post card 801, by the image server 42, the printer 800, and the image server information input device 500x.

When the post card 801 is applied with printing and RF-ID writing, the post card 801 is mailed to the printed destination. The second user, who is designated by the first user as being the destination, receives the post card 801. When the second user presents the received post card 801 to the TV 45, the receiving unit 811 receives the image server information and the registration image ID from the RF-ID unit 47 via the wireless antenna 570. A decryption unit 572 decrypts encrypted information in the image server information and the registration image ID. Next, the URL generation unit 573 generates a URL from which only images identified by the registration image ID from among images stored in the image server 42 are downloaded to the TV 45. More specifically, the URL generation unit 573 may designate an internal directory of the server in the generated URL or may use a method of embedding the registration image ID to the URL as a URL option. By using the URL generated by the URL generation unit 573 to designate the server, the TV 45 accesses the image server to obtain the images, which is the same as described in more detail in Embodiment A1.

It should be noted that it has been described in Embodiment A4 that the user inputs the destination information to the TV 45, but the user may input not only the destination information such as an address and a name but also a message to be printed with an image on a post card. The TV 45 receives the input message together with the destination information and provides them to the image server 42. The printer 800 prints them on the post card. 822 in FIG. 374 illustrates an example of a screen of the TV 45 on which a message to be printed is inputted. If the user can select an image to be printed on the post card and also input an message added to the image, a flexibility in generating a post card with RF-ID is increased.

It should also be noted that the TV 45 according to Embodiment A4 may allow the user to perform operations for images displayed on the TV 45 by using the post card with RF-ID, in the same manner as described in Embodiment A3 for the processing in which the user operates an electronic catalog displayed on a screen by using RF-ID.

As described above, the system according to Embodiment A4 enables the user to mail a post card with RF-ID to a person living in a distant location, without creating a post card attached with RF-ID by the user himself/herself. In addition, when the user wishes to print the image(s) stored in the image server onto the post card to be mailed, the system allows the user to perform operation on a TV screen to select an image(s) to be printed. As a result, high usability is achieved.

Conventionally, if the user intends to show images, on a large screen display device, to a different user living in a remote location, the user in the remote location needs to learn operations of the device (apparatus), an operation acquirer has to go to the remote location to operate the device, or the display device in the remote location should be remotely controlled. The system according to Embodiment A4, however, enables such a user in a remote location to easily view images by a simple operation, for example, by bringing a physical medium such as a post card with RF-ID into proximity of a display device.

[Embodiment A5]

FIG. 376 is a block diagram of a system according to Embodiment A5.

Embodiment A5 of the present invention has the following configuration. A mailing object such as a post card is written with fixed information. The image capturing device associates the fixed information with an image or a group of images (image data) stored in the server. A reproduction side reads the fixed information from the RF-ID attached to the post card or the like in order to display the image data associated with the fixed information. The configuration is illustrated in FIG. 376. Referring to FIG. 376, first, the image capturing device reads the fixed information from the mailing object, then associates the fixed information with an image(s), and registers information of the association (hereinafter, referred to as "association information) into the server. When the user receives the mailing object for which the registration is completed, the user brings the mailing object into proximity of a RF-ID reader of a TV to read the fixed information from the mailing object. The TV queries the server using the fixed information, and thereby displays the image(s) associated with the mailing object.

Embodiment A5 is characterized in that the RF-ID information in the mailing object is not rewritable (ROM) or in non-rewritable environments so that image data in the server is associated with the mailing object without rewriting the fixed information in the mailing object.

<Image Uploading and Mailing Object Associating by Image Capturing Device>

The images captured by the image capturing device are uploaded to the server using the method described in the prior embodiments. Here, an identifier is assigned to an uploaded image or image group. The identifier makes it possible to identify the image or an group of images stored in the server.

FIG. 377 is a diagram illustrating an example of fixed information of a mailing object according to Embodiment A5.

The following describes a method of associating (i) an image or image group which is captured and uploaded to the server by the image capturing device with (ii) fixed information recorded in a RF-ID tag of a mailing object. FIG. 377 illustrates examples of the fixed information recorded in the RF-ID tag of the mailing object. (a) in FIG. 377 illustrates fixed information including: mailing object UID unique to the mailing object; and information such as an address for accessing the image server. (b) in FIG. 377 illustrates fixed information including: the mailing object UID; and information such as an address for accessing a relay server. (c) in FIG. 377 illustrates fixed information including the mailing object UID only. The fixed information may also include a login ID, password information, and the like for accessing the server. It is assumed in Embodiment A5 that such information necessary to access the server is included in a URL including the address information.

FIG. 378 is a flowchart of processing performed by the image capturing device to associate the RF-ID with image data stored in the server, when the image capturing device has a RF-ID reader function.

First, the image capturing device reads information from the RF-ID of the mailing object by using the RF-ID reader (S2500). In more detail, the second antenna 21 illustrated in FIG. 3 communicates with the RF-ID of the mailing object, and thereby the data receiving unit 105 receives the fixed information from mailing object. Then, the second processing unit 95 performs processing to provide the fixed information of the mailing object to the first processing unit 35 via the recording unit 106, the second memory 52, and the recording/reproducing unit 51. The first processing unit 35 associates the mailing object UID read from the mailing object with an image or image group, according to designation from the user (S2501). Then, the image capturing device accesses the server 42 via the first antenna 20 (S2502). Thereby, the image capturing device registers, to the server 42, the association information regarding the association between the mailing object UID and the image data stored in the server 42 (S2503).

FIG. 379 is a flowchart of processing for registering the image capturing device with a relay server, according to Embodiment A5.

If the fixed information read from the mailing object includes an address of the image server or a URL including the address, then the processing is completed. On the other hand, if the fixed information read from the mailing object does not include an address of the image server or a URL including the address, the image capturing device sets a relay server (FIG. 379).

In order to set a relay server, the image capturing device accesses the relay server (S2510). In more detail, if the fixed information read from the mailing object includes an address of a relay server or a URL including the address, then the image capturing device accesses the relay server. Otherwise, the image capturing device accesses a relay server that is previously set for the image capturing device.

After accessing the relay server, the image capturing device sets, in a database of the relay server, association information regarding association between the mailing object UID and the server that is a redirection destination (transfer destination) (S2511). Thereby, association between the mailing object UID and an address of the transfer destination is registered in the database of the relay server.

If the image capturing device does not have a RF-ID reader function and the mailing object is printed with a two-dimensional code or the like indicating information of the RF-ID reader, the image capturing device captures an image of the two-dimensional code using an image capturing unit to read information from the code so that the image capturing device can obtain the same information as the fixed information recorded in the RF-ID unit of the mailing object. The two-dimensional code may be a QR Code™, a PDF417, Veri Code, Maxi Code, or the like. Any other code can be used if the image capturing device can read information from the code by capturing an image of the code. In addition, the same advantages as described in Embodiment A5 can be produced by using a bar-code in a one-dimensional direction only, although a printing area is increased.

FIG. 380 is an example of the mailing object attached with a RF-ID unit 2520 and printed with a two-dimensional code 2521 indicating the same information as that recorded on the RF-ID unit 2520.

A flow of processing data when the two-dimensional code is read by the image capturing device is described with reference to the block diagram of FIG. 3. The two-dimensional code printed on the mailing object is captured by the image capturing unit 30, then converted into an imaged by the video processing unit 31, and provided to the first processing unit 35 via the recording/reproducing unit 32. The first processing unit 35 analyzes the captured two-dimensional code and retrieves the information from the two-dimensional code. The information indicated by the two-dimensional code is basically the same as the information recorded in the RF-ID unit. The information indicated by the two-dimensional code includes at least the mailing object UID.

FIG. 381 is a flowchart of processing using a 2-dimensional bar-code of the image capturing device according to Embodiment A5.

The following describes a flow of the processing from reading the information of the two-dimensional code to associating the information with an image or image group in the server with reference to FIG. 381.

Firstly, the image capturing unit captures an image of the two-dimensional code (S2530). Then, it is determined whether or not the captured image is a two-dimensional code (S2531). If the captured image is not a two-dimensional code, then error processing is performed (S2532). Or, normal image capturing processing may be performed. On the other hand, if the captured image is a two-dimensional code, then the two-dimensional code is analyzed (S2533). Thereby, information is read from the mailing object based on the result of the analysis (S2534). After reading the fixed information from the mailing object, the image capturing device associates the mailing object UID with image data stored in the server (S2535). Then, the image capturing device accesses the server (S2536). Then, the image capturing device sets the association information to the server (S2537). The Steps S2535 to S2537 are the same as the Steps S2501 to S2503 in FIG. 378. Here, if the readout information does not include an address of the image server or a URL including the address, then the image capturing device performs transfer setting to a relay server. The transfer setting to the relay server has been previously described with reference to FIG. 379.

As described above, by reading information from the two-dimensional bar-code printed on the mailing object, it is possible to complete to associate the information recorded on the RF-ID unit with image data stored in the server.

If the image capturing device does not have a RF-ID reader function and the mailing object is not printed with a code such as a two-dimensional code, the image capturing device can read information from the mailing object if the user manually inputs, to the image capturing device, the mailing object UID and the URL such as a sever address which are printed on the mailing object. The user inputs the information using buttons 7 to 15 illustrated in FIG. 2. In this aspect, the URL and the mailing object UID may be printed directly as a plane text or coded to be a code which the user easily inputs.

As described above, even if the image capturing device does not have a RF-ID reader function and the mailing object is not printed with a two-dimensional code, it is possible to associate the mailing object with image data stored in the server.

<Image Reproducing and Viewing by Using RF-ID on Mailing Object>

Next, the steps for viewing images stored in the server on the TV using the mailing object for which association is completed.

FIG. 382 is a flowchart of processing performed by the TV to read RF-ID from the mailing object and eventually access the image server.

When the user brings the mailing object into proximity of the RF-ID reader of the TV, the TV reads information of the RF-ID on the mailing object (S2540). Then, a determination is made as to whether or not the readout information includes a sever address or a URL including the server address (S2541). If the readout information includes a sever address or a URL including the sever address, then the TV accesses the designated server (S2542). Then, the TV transmits the mailing object UID (S2543). Then, a determination is made as to whether or not the server receiving the transmission is a relay server (S2544). If the server is a relay server, then the relay server redirects to a server (the image sever) designated in the relay server (S2547). Thereby, the TV accesses an image or image group in the image server (S2548). On the other hand, if it is determined at S2544 that the server receiving the transmission is the image server, then redirecting is not performed and access to the image server is performed (S2548). Moreover, if it is determined at S2541 that the readout information does not include a sever address, then the TV accesses a server set by a predetermined default (S2545). Then, the TV transmits the mailing object UID to the default server (S2546). The default server redirects to a server (the image server) designated in the default server (S2547) to access the image server.

Here, if association between the mailing object UID and the designated server as a destination of the relay is not registered in a database of the relay or default server, the relay or default server redirects to an error page.

FIG. 383 is a flowchart of processing performed by the relay or default server after receiving the mailing object UID.

When the relay or default server receives the mailing object UID (S2550), the server searches its database for information regarding the mailing object UID (S2551). Then, the relay or default server determines whether or not the database holds information regarding the mailing object UID (S2552). If the database holds the information, then the relay or default server redirects to a server associated with the mailing object UID in the database (S2554). On the other hand, if the database does not hold the information (in other words, if there is no association), then the relay or default server redirects to an error page (S2553).

As described above, the mailing object having fixed information in the RF-ID is previously associated with image data stored in the image server. Thereby, when the mailing object with the association is presented to the TV, the user can view an image or image group in the server which is associated with the mailing object UID, without rewriting of the RF-ID of the mailing object. Therefore, even if the user is away from home and cannot rewrite the RF-ID of the mailing object, or even if the RF-ID of the mailing object is not rewritable, the user can associate images in the server with the mailing object. As a result, the user allows a person receiving the mailing object to view the images associated with the mailing object.

It should be noted that it has been described in Embodiment A5 that the mailing object UID is transmitted after accessing the server. However, it is also possible to generate a URL from the mailing object UID and the sever address recorded on the mailing object in order to access the server. In this aspect, it is possible to perform the access to the server and the transmission of the mailing object UID at the same time.

According to Embodiment A5, even in an environment where the RF-ID cannot be rewritten, such as in a sight-seeing location, for example, the user can associate captured images with a post card and send the post card to a friend. Thereby, the friend receiving the post card presents the post card to a TV to view the images the user captured in the sight-seeing location. As explained above, even in an environment where the RF-ID cannot be rewritten, the user can create a mailing object associated with images in the server and then send the mailing object to a person to which the user desires to show the images.

If the image capturing device has a RF-ID writer function to rewrite the RF-ID of the mailing object, the processing is the same as processing performed by the TV for associating the mailing object with image data in the server, which will be described below in Embodiment A6. Therefore, the processing is not described in Embodiment A5.

[Embodiment A6]

In Embodiment A6, the following configuration is described. The image capturing device captures images and uploads the images to the image server. Then, a user transmitting the images (hereinafter, referred to as a "sending user") selects an image group from the images in the server. Information for accessing the selected image group is recorded in the RF-ID on the mailing object. The mailing object is mailed to a user receiving the images (hereinafter, referred to as a “receiving user”). The receiving user accesses the image group in the image server by using the RF-ID on the mailing object.

FIG. 384 is a schematic diagram of a configuration of an image transmission side according to Embodiment A6 of the present invention.

FIG. 385 is a schematic diagram of a configuration of an image receiving side according to Embodiment A6 of the present invention.

Here, the same reference numerals of FIGS. 1 and 3 are assigned to the identical elements of FIGS. 384 and 385, so that the identical elements are not explained again below.

In FIGS. 384 and 385, a mailing object 3001 is a post card, envelope, or letter paper which is mailed from the image transmission side to the image receiving side. A RF-ID unit 3002 is a rewritable RF-ID. At least part of the RF-ID unit 302 is a rewritable memory unit 3003. The RF-ID unit 3002 is attached to or incorporated into the mailing object 3001 in order to be sent to the image receiving side together with the mailing object.

As described in the prior embodiments, the memory unit 3003 in the RF-ID unit 3002 holds the medium identification information for identifying that the medium having the RF-ID unit 3002 is a mailing object.

Referring to FIG. 385, a TV 3045 is a TV display device provided in the image receiving side. The TV 3045 has the same function as that of the TV 45 in FIG. 384 described in the prior embodiments. Like the TV 45 in FIG. 384, the TV 3045 includes a RF-ID reader/writer 3046 (corresponding to the RF-ID reader/writer 46 in FIG. 384) and a display unit 3047 (corresponding to the display unit 110 in FIG. 384). The TV 3045 is connected to the Internet 40 via a network connection means not shown.

Next, the processing performed by the above configuration is described.

<Image Group Selecting and Mailing Object Writing by Image Transmission Side>

In the image transmission side in FIG. 384, images captured by the image capturing device 1 are transmitted to a wireless access point via the second antenna 20 in the image capturing device 1 used for wireless communication, such as a wireless LAN or WiMAX. The images are recorded as the image data 50 onto the image server 42 via the internet 40. Then, the image capturing device 1 is moved into proximity of the RF-ID reader/writer 46 of the TV 45 in order to establish connection with the TV 45 by wireless communication via the first antenna 21 of the image capturing device 1 used for RF-ID. The TV 45 obtains, from the image capturing device 1, information for accessing the image data 50 in the image server 42. Then, the TV 45 downloads the images of the image data 50 to be displayed on the display unit 110. The above processing is the same as described in the prior embodiments. The above is just a summary.

Next, the sending user checks the images displayed on the display unit 110 of the TV 45 in order to set transmission image selection information indicating whether or not each of the images is to be transmitted to the receiving user (in other words, whether or not each of the images is to be permitted to be viewed by the receiving user). The sending user can set also restriction on display for the receiving user, utility form information such as a slide show and printing, which is described in the prior embodiments. The transmission image selection information and the utility form information are transmitted to and recorded onto the image server. The image server manages, as an image group, a set of images selected as transmission images in the transmission image selection information.

FIG. 386 is a flowchart of processing performed by a TV transmitting image according to Embodiment A6.

The following describes steps performed by the TV 45 for recording, onto the mailing object 3001, information regarding the image group selected by the sending use, with reference to a flowchart of FIG. 386.

It is assumed that transmission images have been selected and an image group set with the utility form information has been generated. Under the assumption, the sending user brings the mailing object 3001 having the RF-ID unit 3002 into proximity of the RF-ID reader/writer 46 of the TV 45 in order to establish wireless communication between the RF-ID unit 3002 and the RF-ID reader/writer 46.

When the TV 45 becomes able to communicate with the RF-ID unit 3002 on the mailing object 3001 via the RF-ID reader/writer 46, the TV 45 reads information from the memory unit 3003 (S3101). Then, the TV 45 determines whether or not the medium identification information indicates that the current communication partner is a mailing object (S3102). If the current communication partner is a mailing object, then the TV 45 proceeds to steps for writing to the mailing object. Here, if it is determined at Step S3102 that the current communication partner is not a mailing object, then the subsequent steps are not described here but the TV 45 proceeds to steps depending on a medium indicated by the medium identification information.

In order to write to the mailing object 3001, first, the TV accesses the image server 42 via the internet 40 (S3103). Thereby, the TV 45 obtains, from the image server 42, image group designation information, such as a server URL and an image group address, for allowing the image receiving side to access the image group in the image server 42 (S3104).

The TV 45 transmits the obtained image group designation information to the RF-ID unit 3002 on the mailing object 3001 via the RF-ID reader/writer 46 of the TV 45 in order to write the image group designation information to the memory unit 3003 in the mailing object 3001, and the RF-ID unit 3002 on the mailing object 3001 records the image group designation information to a rewritable region of the memory unit 3003 (S3105).

As described above, the mailing object 3001 on which the image group designation information is recorded is mailed by the sending user to a user of the image receiving side.

<Image Reproducing and Viewing by Image Receiving Side>

FIG. 387 is a flowchart of processing performed by a TV receiving image according to Embodiment A6.

Next, the image receiving side is described with reference to FIG. 385 illustrating the schematic block diagram of the image receiving side and FIG. 387 illustrating a flowchart of processing performed by the TV in the image receiving side.

Referring to FIG. 385, the receiving user receives the mailing object 3001 from the sending user. Then, the receiving user checks the RF-ID unit 3002 or characters or design indicated on the mailing object 3001 to determine whether the mailing object is incorporated with a means for accessing images. Here, the receiving user needs only to understand that the receiving user can access to the images by using the mailing object 3001. The receiving user does not need to care about the image group designation information and the like in the RF-ID unit 3002.

In order to reproduce and view the images, the receiving user brings the mailing object 3001 into proximity of the RF-ID reader/writer 3046 of the TV 3045 in the image receiving side so as to start viewing of the images.

If the RF-ID unit 3002 on the mailing object 3001 is in enough proximity of the RF-ID reader/writer 3046 of the TV 3045, the RF-ID reader/writer 3046 supplies power to the RF-ID unit 3002 of the mailing object 3001 via antennas (not shown) of both the RF-ID reader/writer 3046 and the RF-ID unit 3002 in order to activate the RF-ID unit 3002. Thereby, wireless communication between the TV 3045 and the RF-ID unit 3002 of the mailing object 3001 starts. When the wireless communication starts, the TV 3045 reads information from the memory unit 3003 of the RF-ID unit 3002 (S3151).

A determination is made as to whether or not the medium identification information in the readout information indicates that the current communication partner is a mailing object (S3152). If the current communication partner is a mailing object, then the TV 3045 proceeds to processing of reading the image group designated by the sending user from the image server 42.

The access to the image server 42 makes it possible to generate a URL for accessing the image group in the image server 42 by using the image group designation information in the information read by the RF-ID unit 3002 at Step S3151, such as an image group address, and thereby to access the image server 42 via the internet 40 (S3153).

The TV 3045 connected to the image server 42 at the above step obtains the images (the image group) which are permitted to be displayed, from among the image data 50 in the image server 42, based on the transmission image selection information indicating the image group managed by the image server 42 (S3154). Then, the TV 3045 displays the images on the display unit 110 (S3155).

Furthermore, according to the transmission image selection information indicating the image group managed by the image server 42 and the utility form information, the receiving user can use functions of, for example, reproducing the images as a slide show, printing the images, and downloading the images to a recording medium (not shown) attached to the TV 3045 or connected to the outside.

In addition, for image printing, the user can print the images by the printer on a LAN (not shown), and also ask, via the internet 40, a photograph print service provider to print the images.

As described above, with the above configuration according to Embodiment A6 of the present invention, the image group designation information is provided from the RF-ID unit 3002 on the mailing object 3001 to the TV 3045 in the image receiving side. Therefore, the receiving user does not need to input characters of a network access destination to obtain images, for example. In other words, the intuitive and simple operation of simply bringing the mailing object 3001 into proximity of the TV 3045 enables the receiving user to access the image data 50 stored in the image server 42. As a result, the receiving user can obtain images from the image server, without knowledge of complicated operations such as menu selection and character inputs.

It should be noted that it has been described in Embodiment A6 that the mailing object 3001 is previously attached or incorporated with the RF-ID unit 3002. However, the mailing object may be a general post card or letter paper attached with an independent RF-ID unit 3002 that is provided separately. In this aspect, the above effect can be produced by later attaching the RF-ID unit to the mailing object. This produces further advantages that the sending user can use Embodiment A6 for any desired mailing object.

It should also be noted that, if the access to the image server 42 requires a login operation, a server login ID and a server login password may also be written at Step S3105 into the rewritable region of the memory unit 3003 in the RF-ID unit 3002 on the mailing object 3001. Here, it is desirable that the login ID and the login password are not plane texts but are written in an encrypted format for security.

It should also be noted that it has been described in Embodiment A6 that the TV 45 in the image transmission side performs selection of transmission images, setting of the utility form information, and writing of the image group designation information to the RF-ID unit 3002 on the mailing object 3001. However, it is also possible that the image capturing device 1 having a RF-ID reader/writer function performs setting of the transmission image selection information and the utility form information and writing of the image group designation information, in order to produce the same effect as described above for obtaining images by the simple operation of the receiving user.

<Variation of Sixth Embodiment>

FIG. 388 is a flowchart of processing performed by the TV 45 in the image transmission side according to a variation of Embodiment A6 of the present invention.

Here, the same step numerals of FIG. 386 are assigned to the identical steps of FIG. 388, so that the identical steps are not explained again below.

According to the variation of Embodiment A6, the mailing object UID is previously recorded on the memory unit 3003 of the RF-ID unit 3002 on the mailing object 3001. Here, it is desirable to record the mailing object UID on a ROM region of the memory unit 3003 in order to reduce risks of data damages or data manipulation caused by accidental operations.

FIG. 389 is a table of an example of information recorded in a mailing object memory unit according to Embodiment A6.

FIG. 389 illustrates a diagram of an example of a data structure of the memory unit 3003.

The TV 45 in the image transmission side sets the transmission image selection information and the utility form information into the above-described RF-ID unit in order to designate an image group in the image serve 42. In this situation, the TV 45 performs processing according to the flowchart of (a) in FIG. 388.

The TV 45 reads information from the RF-ID unit 3002 on the mailing object 3001 (S3101) and determines based on the medium identification information that the communication partner is a mailing object (S3102). After that, the TV 45 obtains the mailing object UID. The mailing object UID may be the information read at Step S3101 or be newly obtained from the RF-ID unit 3002. Next, the TV 45 accesses the image server 42 via the Internet 40 (S3202). The TV 45 transmits the mailing object UID to the image server 42, and thereby the image server 42 associates with the transmitted mailing object UID with an address of the image group and then stores the manages information of the association (association information) (S3203).

The TV 45 obtains, from the image server 42, the server URL enabling the image receiving side to access the image server 42 (S3204). The obtained server URL is written into the rewritable region of the memory unit 3003 in the RF-ID unit 3002 on the mailing object 3001 via the RF-ID reader/writer 46 (S3205).

As described above, if the image server associates the image group with the mailing object UID and then stores and manages the association information, the utility form information can be managed separately for each mailing object UID. Therefore, in the situation where there are a plurality of the mailing objects 3001, it is possible to change an operation for receiving images for each mailing object, namely, for each different receiving user.

If, in the configuration described in Embodiment A6, the image receiving side designates an image group for each mailing object, generates a different image group address for each designated image group, and writes the image group address into a corresponding RF-ID unit, the image transmission side needs complicated operations for designating image groups separately although the same advantages as those of Embodiment A6 can be obtained.

Therefore, when the sending user selects the same transmission image group for a plurality of mailing objects, it is preferable that the sending user records and manages different utility form information for each mailing object by using the mailing object UID as described earlier. Thereby, it is possible to reduce operations of the sending user, and to reduce a memory capacity of the image server because it is not necessary to hold pieces of the transmission image selection information separately, thereby producing further advantages.

The processing of (b) in FIG. 388 differs from the processing of (a) in FIG. 388 in that Steps S3204 and S3205 are replaced by Steps S3214 and 3215. At Step 3214, the TV 45 obtains an image group address in addition to the server URL. At Step S3215, the TV 45 writes the image group address together with the server URL into the memory unit 3003 of the RF-ID unit 3002.

Thereby, when the image receiving side is to receive images, the image receiving side accesses the designated image group in the image server 42. Here, the access is permitted only when the mailing object UID of the image group stored and managed in the image server matches the mailing object UID used by the receiving server requesting the access. Thereby, security is increased.

Conventionally, if the user intends to show images, on a large screen display device (apparatus), to a different user living in a remote location, the user in the remote location needs to learn operations of the device, an operation acquirer has to go to the remote location to operate the device, or the display device in the remote location should be remotely controlled. However, like Embodiment A4, the system according to Embodiment A6 enables such a user in a remote location to easily view images by a simple operation, for example, by bringing a physical medium such as a post card with RF-ID into proximity of a display device. In Embodiment A4, generation of the post card with RF-ID and writing of data into the RF-ID is not performed by the user (who captures and sends images or who views the images), but by a service provider. In Embodiment A6, however, the sending user in the image transmission side performs generation of the post card with RF-ID and writing of data into the RF-ID.

[Embodiment A7]

In Embodiment A7 of the present invention, a method of changing setting for a device (apparatus) by using a RF-ID card according to Embodiment A7 of the present invention is described.

The following describes a method of changing setting for a recorder by using a RF-ID card with reference to FIGS. 390 and 391.

FIG. 390 is a block diagram of a structure of a recorder according to Embodiment A7.

A recorder 2000 records broadcast contents obtained by a tuner 2001, onto a Hard Disk Drive (HDD) 2008 or an optical disk drive 2009. In addition, the recorder 200 reproduces, on the TV 45, the recorded contents or video/audio contents read by the optical disk drive 2009.

An input signal processing unit 2002 includes an Analog/Digital (A/D) converter, a decoder, and an encoder, in order to convert input video/audio signals into data in a predetermined video/audio format. The A/D converter converts analog signals obtained by the tuner 2001 into digital signals. The decoder decodes scrambled contents. The encoder converts data into data in a video format according to MPEG-2, for example.

An output signal processing unit 2003 includes a Digital/Analog (D/A) converter and a decoder in order to provide video and audio to the TV 45. The D/A converter converts digital signals to analog signals. The decoder decodes data in a data format according to MPEG-2, for example.

A system control unit 2004 controls operations of the recorder 2000. The system control unit 2004 includes a setting information processing unit 2011 that switches setting for the recorder 2000. The setting information processing unit 2011 will be described in detail later.

A memory 2005 holds recorder ID 2012 for identifying the recorder 2000, and setting information 2013 for the recorder 2000.

An operation input unit 2006 receives inputs from a user using buttons of a remote controller, a front panel, or the like (not shown).

A communication unit 2007 connects the recorder 2000 to the server 42 via the internet or a LAN.

The HDD 2008 has an area in which recorded contents and content lists provided from the input signal processing unit 2002 are stored.

The optical disk drive 2009 is a disk drive that performs recording or reproducing for an optical disk such as a Digital Versatile Disc (DVD) or a Blue-ray Disc. The optical disk drive 2009 records recorded contents and content lists provided from the input signal processing unit 2002 onto the optical disc, and reproduces video/audio contents in the optical disk.

The input signal processing unit 2002, the output signal processing unit 2003, the system control unit 2004, the HDD 2008, and the optical disk drive 2009 of the recorder 2000 are connected one another via a bus 2010.

Here, the setting information processing unit 2011 is described in more detail below.

According to the setting information 2013 stored in the memory 2005, the setting information processing unit 2011 sets displaying of a menu screen, a recording/reproducing mode, chapters of recorded contents, TV program recommendation based on user's preference, and the like regarding the recorder 2000. In more detail, the setting information processing unit 2011 reads an identifier indicating, for example, "menu screen background color: Black" from the setting information 2013, and thereby issues a request for menu screen display to the output signal processing unit 2003 together with an instruction for displaying a background of a menu screen in black.

Here, the setting information 2013 may be stored in an external storage unit such as a SD card not shown. Especially, it is efficient to store, in the HDD 2008, the setting information regarding chapters of recorded contents stored in the HDD 2008, information having a large size, and the like.

Conventionally, the setting information 2013 has been set prior to purchase of the recorder 2000, or set by operations of the user using the operation input unit 2006. In Embodiment A7 of the present invention, however, the setting information 2013 can be changed based on information obtained from the RF-ID reader/writer 46.

FIG. 392 is a block diagram of a structure of the RF-ID card from which information is read by the RF-ID reader/writer 46 of the recorder 2000 to be used to change the settings of the recorder 2000.

The RF-ID card 2100 includes a memory 2101, the antenna 21, the power supply unit (second power supply unit) 91, the data receiving unit 105, the data transfer unit 108, a processing unit 2102, the recording unit 106, and the reproducing unit 107.

When the RF-ID card 2100 is moved to bring the antenna 21 into proximity of the RF-ID reader/writer 46 of the recorder 2000, the RF-ID reader/writer 46 supplies power to the power supply unit 91 via the antenna 21 in order to provide power to the respective units in the RF-ID card 2100.

Information regarding data recording/reproducing is read from the RF-ID card 2100 to the recorder 2000 via the RF-ID reader/writer 46. In the recorder 2000, the information is received by the data receiving unit 105 and then provided to the processing unit 2102.

In the RF-ID card 2100, the processing unit 2102 causes the recording unit 106 to record information onto the memory 2101, and causes the reproducing unit 107 to reproduce the information stored in the memory 2101.

The data transfer unit 108 transmits the information provided from the processing unit 2102 to the RF-ID reader/writer 46 of the recorder 2000 via the antenna 21.

The memory 2101 in the RF-ID card 2100 stores the UID 75, the medium identification information 111, and apparatus operation information 2103.

The UID 75 and the medium identification information 111 are used to identify the RF-ID card 2100.

The UID 75 is identification unique to the RF-ID card 2100.

The medium identification information 111 holds an identifier indicating that the RF-ID card 2100 is a card.

The apparatus operation information 2103 holds pieces of information regarding an apparatus (device) to perform an operation using the RF-ID card 2100 and regarding the operation. The following describes the pieces of information included in the apparatus operation information 2103.

Operation apparatus identification information 2104 indicates a type of the apparatus (device) to perform the operation using the RF-ID card 2100. The operation apparatus identification information 2104 indicates the type by an identifier in the similar manner as described for the medium identification information 111. In FIG. 391, the operation apparatus identification information 2104 holds an identifier indicating that a type of the apparatus to perform the operation is a recorder.

Target apparatus information 2105 holds information so that only a specific apparatus (device) can perform the operation using the RF-ID card 2100. In the example of FIG. 391, the target apparatus information 2105 holds recorder ID 2012 for identifying the recorder 2000. It should be noted that, if an apparatus that can use the RF-ID card 2100 according to Embodiment A7 of the present invention is limited, for instance, if only recorders can use the RF-ID card 2100, the operation apparatus identification information 2104 and the target apparatus information 2105 may not be included in the apparatus operation information 2103. In addition, if the setting information processing unit 2011 in the recorder 2000 has a structure to change settings of the recorder 2000 by using the information in cards, the medium identification information 111 may not be included in the memory 2101.

Operation instruction information 2106 indicates details of the operation to be performed by the apparatus designated in the apparatus operation information 2103. In the example of FIG. 391, the operation instruction information 2106 includes information 2109 indicating that setting is to be changed (setting change), information 2110 indicating a target for which the setting change is to be performed (change target information), and information 2111 indicating that communication is to be executed in obtaining the setting information (communication execution).

It should be noted that the operation instruction information 2106 is not limited for a single operation, but may include plural pieces of information for plural operations, or may be a program in which the plural operations are combined.

Communication information 2107 is information regarding a server or the like. When the recorder 2000 is instructed based on the operation instruction information 2106 to access the server or the like to obtain data, the recorder 2000 accesses the server or the like using the communication information 2107. In the example of FIG. 391, the communication information 2107 includes a URL 2112, login ID 2113, and a password 2114 of the server or the like. The URL 2112 may be replaced by an IP address. If the recorder 2000 is to access a different apparatus (device) via an office or home network, the URL 2112 may be information for identifying the apparatus, such as a MAC address.

FIG. 392 is a flowchart of steps of registering setting information to a server.

The following describes processing by which the recorder 2000 registers the setting information from the recorder 2000 to a server by using the RF-ID card 2100 with reference to FIG. 392.

At Step 2201, when the recorder 2000 receives an input from the user using the operation input unit 2006, the setting information processing unit 2011 causes the output signal processing unit 2003 to issue, to the TV 45, a request for message display. In response to the request, the TV 45 displays a message "Please present a RF-ID card" on its screen at Step 2202. The message may be displayed on a console (not shown) of the recorder 2000. It is also possible that the recorder 2000 requests the user for authentication such as a password or biometric authentication when the user performs the input operation, and after the authentication, proceeds to the setting registration processing. It is further possible that the recorder 2000 does not request the TV 45 for the message display, but the user needs to present the RF-ID card 2100 to the RF-ID reader/writer 46 when using the recorder 2000 in order to perform steps of and after 2203. It is still further possible that an enquiry message is displayed to enquire where the setting information 2013 is to be registered, and the setting information 2013 is registered into the location the user designates. For example, the setting information 2013 may be registered into the RF-ID card 2200, or into a sever different from the server 42.

At Step 2203, the recorder 2000 detects the RF-ID card. After that, mutual authentication between the recorder 2000 and the RF-ID card 2100 is performed at Step 2204.

If the mutual authentication at Step 2204 is successful, then the processing proceeds to Step 2205. Otherwise, the processing returns to Step 2202 to repeat the detection of the RF-ID card.

At Step 2205, the recorder 2000 obtains the UID 75 from the memory 2101 in the RF-ID card 2100.

At Step 2206, the recorder 2000 obtains the communication information 2107 from the memory 2101 in the RF-ID card 2100. If the memory 2101 in the RF-ID card 2100 does not hold the communication information, the recorder 2000 may issue, to the user, a request for providing the communication information. Moreover, if the user instructs at Step 2201 the recorder 2000 to register the setting information 2013 into a location that is not designated in the RF-ID card 2100, Step 2206 is not performed. If plural pieces of the communication information 2107 are stored in the RF-ID card 2100, it is possible to display a list of the plural pieces of the communication information 2107 from which the user can select a desired one.

At Step 2207, the recorder 2000 gets the recorder ID 2012 and the setting information 2013 from the memory 2005. The setting information 2013 is not limited to information currently stored, but may be information inputted by the user in the setting registration processing.

At Step 2208, in the recorder 2000, the setting information processing unit 2011 issues, to the communication unit 2007, a request for access to a server or the like having the URL 2112 included in the obtained communication information 2107. The communication unit 2007 accesses the server using the login ID 2113 and the password 2114.

At Step 2209, it is determined whether or not the access to the server 42 is successful. If the access is successful, then the processing proceeds to Step 2210. Otherwise, the setting registration processing is terminated.

At Step 2210, the recorder 2000 transmits, to the server 42, the UID 75, and the recorder ID 2012 and the setting information 2013 which are obtained from the memory 2005, thereby registering the setting information 2013 into the server 42.

At Step 2211, the recorder 2000 generates the operation instruction information 2106, using (a) the operation designated at Step 2201 or a storage location of the setting information 2013 selected at Step 2201, (b) the setting information 2013 obtained at Step 2207, and (c) the communication information 2107 obtained at Step 2206.

At Step 2212, the recorder 2000 performs the same step as Step 2202 to cause the TV 45 to displays a message "Please present a RF-ID card" on its screen.

At Step 2213, the recorder 2000 detects the RF-ID card. After that, mutual authentication between the recorder 2000 and the RF-ID card 2100 is performed at Step 2214.

If the mutual authentication at Step 2214 is successful, then the processing proceeds to Step 2215. Otherwise, the processing returns to Step 2212 to repeat the detection of the RF-ID card 2100.

At Step 2215, the recorder 2000 obtains the UID from the memory 2101 in the RF-ID card 2100.

At Step 2216, it is determined whether or not the UID 75 obtained at Step 2205 matches the UID obtained at Step 2215. If the UIDs match, then the processing proceeds to Step 2217. Otherwise, the processing returns to Step 2211 to repeat the detection of the RF-ID card 2100.

At Step 2217, the recorder 2000 transmits, to the RF-ID card 2100, the operation apparatus identification information 2104 (not shown in FIG. 77) stored in the memory 2005, the recorder ID 2012, the operation instruction information 2106 generated at Step 2211, and the communication information 2107, in order to record (register) these pieces of information onto the memory 2101 of the RF-ID card 2100. As a result, the setting registration processing is completed.

FIG. 393 is a diagram illustrating a structure of pieces of setting information registered in the server.

Referring to FIG. 393, the setting information registered into the server 42 by the above-described processing of FIG. 392 is described.

Each of the setting information registered in the server 42 is hereinafter referred to as setting information 2250. Each setting information 2250 is registered in association with a corresponding one of the UID 75 and a corresponding one of the target apparatus information 2105. In more detail, the setting information 2250 holds an identifier indicating, for example, "menu screen background color: Black". In the example of FIG. 80, a letter "A" or "B" at the end of pieces of the setting information 2250 indicates that the setting is different from another.

It is also possible that plural pieces of setting information are registered for a single UID such as UID0001 in FIG. 80. It is further possible that a single piece of the target apparatus information 2105, such as REC-0001, is registered for plural pieces of setting information associated with different UID. Here, the setting information may include the change target information 2110.

FIG. 394 is a diagram illustrating a structure of pieces of apparatus operation information registered in the RF-ID card.

Next, referring to FIG. 394, the apparatus operation information 2103 registered in the memory 2101 of the RF-ID card 2100 by the above-described processing of FIG. 392 is described.

It is assumed in the example of FIG. 81 that the UID 75 designates "UID0001" and the medium identification information 111 designates a "card".

The apparatus operation information 2103 includes sets each including the operation apparatus identification information 2104, the target apparatus information 2105, the operation instruction information 2106, and the communication information 2107. Here, it is possible that the communication information 2107 is not registered as being information not related to the other pieces of information. For instance, it is possible that only a piece of the communication information 2107 is registered to always access the same server in using the RF-ID card 2100.

The operation instruction information 2106 includes instruction detail information 2260, instruction target information 2261, and communication execution information 2262. The instruction detail information 2260 holds an identifier indicating an operation to be performed by the device designated by the target apparatus information 2105. The instruction target information 2261 holds an identifier indicating a setting, such as a menu screen mode or recording mode, of the apparatus to perform the operation, such as REC-0001. The communication execution information 2262 holds an identifier indicating whether or not communication is to be executed in performing the operation indicated in the instruction detail information 2260. It should be noted that the apparatus operation information 2103 may include only the communication information 2107 if the operating to be performed using the RF-ID card 2100 is limited to changing of setting.

The communication information 2107 holds a URL, login ID, a password, and the like for accessing a server that is a partner of communication, if the communication execution information 2262 indicates that the communication is to be executed.

FIG. 395 is a flowchart of steps of updating setting information of a recorder by the RF-ID card.

Next, the description is given for processing of changing the setting of the recorder 2000 by using the RF-ID card 2100 with reference to FIG. 395. FIG. 395 is a flowchart of processing by which the setting information processing unit 2011 in the recorder 2000 updates the setting information 2013 by using the RF-ID card 2100.

First, at Step 2301, the recorder 2000 detects the RF-ID card 2100. After that, at Step 2302, the recorder 2000 performs mutual authentication with the RF-ID card 2100.

At Step 2303, the recorder 2000 determines whether or not the mutual authentication is successful. If the mutual authentication is successful, then the processing proceeds to Step 2304. Otherwise, the setting update processing is terminated.

At Step 2304, the recorder 2000 obtains the UID 75 and the apparatus operation information 2103 from the memory 2101 of the RF-ID card 2100.

At Step 2305, the recorder 2000 searches the apparatus operation information 2103 for the operation apparatus identification information 2104. At Step 2306, the recorder 2000 compares the searched-out operation apparatus identification information 2104 to apparatus identification information (not shown) in the memory 2005 of the recorder 2000.

If it is determined at Step 2306 that the operation device identification information 2104 matches the device identification information, then the processing proceeds to Step 2307. Otherwise, the processing proceeds to Step 2314.

At Step 2314, the recorder 2000 determines whether or not all pieces of the operation apparatus identification information 2104 in the apparatus operation information 2103 have been examined. If all pieces of the operation apparatus identification information 2104 have been examined, then the setting update processing is terminated.

At Step 2307, the recorder 2000 searches the device operation information 2103 for the target apparatus information 2105. At Step 2308, the recorder 2000 compares the searched-out target apparatus information 2105 to the recorder ID 2012 in the memory 2005 of the recorder 2000.

If it is determined at Step 2308 that the target device information 2105 matches the recorder ID 2012, then the processing proceeds to Step 2309. Otherwise, the setting update processing is terminated.

At Step 2309, the recorder 2000 obtains the operation instruction information 2106 associated with the target device information 2105 from the apparatus operation information 2103.

At Step 2310, the recorder 2000 obtains the operation instruction information 2107 associated with the target apparatus information 2105 from the apparatus operation information 2103.

At Step 2311, the recorder 2000 determines, based on the instruction detail information 2260 in the operation instruction information 2106 in the device operation information 2103, that an operation to be performed is updating of setting, and thereby accesses the server 42 to obtain the setting information 2250 from the server 42. The step will be described in more detail with reference to FIG. 396.

At Step 2312, the recorder 2000 determines whether or not the obtainment of the setting information 2250 is successful. If the obtainment of the setting information 2250 is successful, then the processing proceeds to Step 2313. At Step 2313, the setting information processing unit 2011 in the recorder 2000 updates the setting information 2013 in the memory 2005 of the recorder 2000 by the setting information 2250. On the other hand, if the obtainment of the setting information 2250 fails, then the setting update processing is terminated.

FIG. 396 is a flowchart of steps of obtaining the setting information from the server.

The following describes Step 2311 in FIG. 395 in more detail with reference to FIG. 396. FIG. 395 is a flowchart of processing by which the setting information processing unit 2011 in the recorder 2000 accesses the server 42 to obtain the setting information 2250 from the server 42.

At Step 2351, the communication unit 2007 in the recorder 2000 accesses the server 42 having the URL 2112 included in the communication information 2107.

At Step 2352, the setting information processing unit 2011 provides the communication unit 2007 with the login ID 2113 and the password 2114 which are included in the communication information 2107, and thereby the communication unit 2007 logins to the server 42.

At Step 2353, it is determined whether or not authentication (namely, the login) is successful. If the authentication is successful, then the processing proceeds to Step 2354. Otherwise, the processing is terminated as being failure of obtaining the setting information 2250.

At Step 2354, the recorder 2000 searches the server 42 for UID. At Step 2355, the recorder 2000 determines whether or not the searched-out UID matches the UID 75 obtained at Step 2304 in FIG. 395. If the searched-out UID matches the UID 75, then the processing proceeds to Step 2356. Otherwise, the processing returns to Step 2354 to repeat the search for UID until it is determined at Step 2359 that all pieces of UID in the server 42 have been examined. If it is determined at Step 2359 that all pieces of UID in the server 42 have been examined, then the processing is terminated as being failure of obtaining the setting information 2250.

At Step 2356, the recorder 2000 searches the server 42 for the target apparatus information associated with the UID 75. At Step 2357, the recorder 2000 determines whether or not the searched-out target apparatus information matches the target apparatus information 2105 obtained at Step 2305 in FIG. 395. If the searched-out target apparatus information matches the target apparatus information 2105, then the processing proceeds to Step 2358. On the other hand, if the searched-out target apparatus information does not match the target apparatus information 2105, then the processing proceeds to Step 2358, then the processing returns to Step 2354 to repeat the search for the target apparatus information until it is determined at Step 2360 that all pieces of the target apparatus information in the server 42 have been examined. If it is determined at Step 2360 that all pieces of the target apparatus information have been examined, then the processing is terminated as being failure of obtaining the setting information 2250.

At Step 2258, the recorder 2000 obtains, from the server 42, the setting information 2250 associated with the UID 75 and the target apparatus information 2105.

As described above, the use of the RF-ID card 2100 enables the user to perform setting of the recorder 2000 without complicated operations. Even if the user is not familiar with operations of apparatuses (devices) the user can easily change the setting of the recorder 2000 by using the RF-ID card 2100. Moreover, the operation executable for the recorder 2000 by using the RF-ID card 2100 is not limited to the setting change. For example, the instruction detail information can designate an operation of obtaining a list of recorded contents in the recorder. In this case, the list is registered in the RF-ID card or the server. Thereby, the user can check the list on a different apparatus (device) other than the recorder by using the RF-ID card.

FIG. 397 is a diagram illustrating a structure of apparatus operation information registered in the RF-ID card used in the recorder.

In addition, the RF-ID card holding information illustrated in the FIG. 397 allows the user to perform timer recording in the recorder simply by presenting the RF-ID card to the recorder. In more detail, if the change target information associated with Index 1 in FIG. 84 is applied, the recorder can perform timer recording according to setting of "TV program ID" and "recording mode" designated in the instruction target information, simply by presenting the RF-ID card to the recorder. Thereby, the timer recording can be performed without accessing the server. In addition, if the change target information associated with Index 2 in FIG. 397 is applied, the recorder can perform timer recording according to "TV program code" designated in the instruction target information, simply by presenting the RF-ID card to the recorder. Here, the recorder can obtain, from the server, (a) program ID or a start time and end time, and (b) channel information. As a result, the time recording can be performed according to the setting of the "recording mode". Furthermore, it is also possible that "recommended TV program" is designated in the instruction target information in the RF-ID card. After presenting the RF-ID card to the recorder, the recorder obtains ID of the recommended TV program from the server. Thereby, the recorder can obtain a content of the recommended TV program from the server and performs timer recording of the content. The above functions may be used as service for providing the RF-ID card as being a supplement of a TV program guide magazine, for example. This RF-ID card can reduce user's bothersome procedures for timer recording. For another service, it is also possible in the RF-ID card that the instruction detail information designates a download operation, the instruction target information designates video or software in a version where a function is restricted, and the communication information designates a URL of a download website. Such RF-ID cards are provided for free to users. The users can use the video or software as trial, and purchase it if the user likes it.

It should be noted that the description in Embodiment A7 has been given for the recorder, but the present invention is not limited to the recorder.

For example, Embodiment A7 of the present invention may be implemented as a TV having a reader/writer for the RF-ID card and the setting information processing unit. The TV can register, as the change target information, (a) setting of an initial display channel or initial sound volume immediately after power-on, (b) setting of child lock for excluding adult broadcasts and violence scenes, (c) setting of zapping for favorite channels, (d) setting of contrast and brightness of a screen, (e) setting of a language, (f) setting of a continuous use time, and the like, simply by presenting the RF-ID card to the TV. Thereby, the TV can perform settings according to usability. Furthermore, Embodiment A7 may be implemented also as a vehicle navigation system having a reader/writer for the RF-ID card and the setting information processing unit. In this aspect, the instruction detail information designates "highlighted display" and the instruction target information designates "landmark information". Thereby, by using the RF-ID card, the vehicle navigation system can display the designated landmark as being highlighted, by changing a character font, character size, or color. The landmark information may be obtained from a server.

FIG. 398 is a diagram illustrating a structure of apparatus operation information registered in the RF-ID card used in a vehicle navigation device.

In this case, the RF-ID cards, on which the apparatus operation information illustrated in FIG. 398 is recorded, are offered to users at rest areas or interchanges on expressways, sightseeing spots, and the like. Thereby, the RF-ID cards allow vehicle navigation systems of the users to display a recommended landmark, where an even is currently held for example, as highlighted display. In addition, Embodiment A7 may be implemented as a laptop having a reader/writer for the RF-ID card and the setting information processing unit. The laptop can designate (a) setting of a resolution of a screen, (b) setting of a position of an icon or the like on a display, (c) setting of a wallpaper, (d) setting of a screen saver, (e) setting of start-up of resident software, (f) setting of employed peripheral devices, (g) setting of a dominant hand for a mouse or the like, and the like, by simply by presenting the RF-ID card to the laptop. Therefore, if the user brings the RF-ID card in a business trip, the user can operate a different personal computer at the business trip location, with the same settings as those the user usually uses. Embodiment A7 may be implemented further as a game machine having a reader/writer for the RF-ID card and the setting information processing unit.

The user visiting a friend's house uses a RF-ID card in which the instruction detail information designates setting change. By presenting the RF-ID card to the game machine at the friend's house, the user can change (a) setting of positions of keys on a remote controller and (b) setting of a structure of a menu screen. In addition, the user can save data in the game machine by using the RF-ID card. Moreover, the following service using the RF-ID card is also possible. The RF-ID card holds the instruction detail information designating a download operation. Such RF-ID cards are offered to users as supplements of magazines or the like. The users can use the RF-ID cards to download an additional scenario, a rare item, or the like.

The RF-ID card according to Embodiment A7 of the present invention can be also applied to home appliances connected to one another via a network. In this aspect, the RF-ID card previously holds (a) setting of a temperature of an air conditioner, (b) setting for a temperature of hot water in a bus tab, and the like, depending of the user's preference. Thereby, the user presents the RF-ID card to RF-ID reader/writers in the user's house so as to manage settings of the home appliances at once. In addition, the RF-ID card may designate an operation for checking foods stored in a refrigerator. Here, information of the foods which is registered in the refrigerator is obtained by using RF-ID tags previously attached to the foods. Or, video of the inside of the refrigerator is captured by using camcorder. Thereby, the user can check a list of the foods on a TV by using a RF-ID reader/writer to obtain information from the RF-ID card. As described above, the RF-ID card according to Embodiment A7 of the present invention can be applied for various usages. It is also possible to combine (a) RF-ID cards for designating apparatuses (such as four different cards indicating "heating appliance", "cooling appliance", "stove", and "fan", respectively) and (b) RF-ID cards for designating setting of the apparatuses (such as three different cards indicating "weak", "medium", and "strong", respectively). It is further possible that such RF-ID cards having the apparatus-designating and setting-designating functions are integrated into a single RF-ID card. And, the settings of the apparatuses can be customized.

Although only some exemplary embodiments of the present invention have been described in detail above, those skilled in the art will be readily appreciate that many modifications are possible in the exemplary embodiments without materially departing from the novel teachings and advantages of the present invention. Accordingly, all such modifications are intended to be included within the scope of the present invention.

For example, if two users (hereinafter, referred to as a user A and a user B) exchanges photographs between them, the user B can view photographs taken by the user A by the following method. The user B has a TV having an apparatus ID and a relay server having a URL. The apparatus ID and the URL are previously stored in a RF-ID (hereinafter, referred to as a RF tag B). The user B generates information (hereinafter, referred to as device generation information B) from the information in the RF tag B and stores the generated device generation information B into the RF tag B. The user B transmits the device generation information B to the user A via e-mail or the like. The user A stores a URL of a server holding the photographs into the relay server, in association with the received device generation information B. Thereby, the user B simply presents the RF tab B to a RF-ID reader/writer of the TV in order to view the photographs taken by the user A. Here, it is assumed that the RF tag B previously holds an e-mail address of the user A. When the user B simply presents the RF tag B to the RF-ID reader/writer of the TV, the device generation information B may be automatically written into the TV and a notification of the device generation information B may be automatically transmitted to the e-mail address of the user A. Thereby, even if the user B is not familiar with operations of the devices, the user B can exchange photographs with the user A. Furthermore, it is also possible that the user A encrypts at least one of a URL, login ID, and a password by using the device generation information B and sends, to the user B, a post card with RF-ID on which the encrypted information is recorded. This makes it possible to restrict an apparatus permitted to display the photographs, only to the TV of the user B. It is further possible that the user A sends, to the user B, a post card with two RF-IDs that are a RF-ID for sending and a RF-ID for returning. In this aspect, the user A records, onto the RF-ID for returning, device generation information A that is previously generated by a TV or the like of the user A. This can restrict an apparatus permitted to display photographs stored by the user B. More specifically, when the user B receives the post card with the two RF-IDs and returns the post card to the user A, the user B encrypts, by using the device generation information A, a URL, a login ID, or a password of a server storing the photographs of the user B, and then records the encrypted data onto the RF-ID for returning. Or, when the user B stores the photographs, the user B associates the photographs with the device generation information A. Therefore, an apparatus permitted to display photographs stored by the user B can be restricted.

Moreover, the mailing object UID of the RF-ID on the mailing object may be a combination of (a) a group ID that is common among a plurality of mailing objects and (b) a UID unique that is unique to each mailing object. Thereby, image data in the server is associated not with every mailing object UID but with the group ID. Therefore, when post cards with RF-ID on which the image data is associated with a plurality of targets are mailed, it is possible to eliminate user's bothersome procedures for performing registration for each of the UIDs. It is also possible that the image data stored in the server in association with the group ID is switched to be permitted or inhibited to be viewed for each of the UID. Thereby, if, for example, a printer prints destination addresses on the mailing objects, the printer having a RF-ID reader/writer reads the UIDs on the mailing objects and thereby associates the UIDs with addresses in an address list, respectively. Thereby, the address list can be used to manage the permission/inhibition of viewing the images stored in the server.

It is also possible that a post card or card is provided with a plurality of RF-ID tags having various different functions. In this aspect, the single post card or card can switch the functions by disconnecting communication of a part of the RF-ID tags which are not currently used. For example, a post card has (a) an upper portion on which a RF-ID tag having a function of displaying a slide show of photographs is attached and (b) a lower portion on which a RF-ID tag having a function of reproducing video. A user can switch the display function or the reproduction function, by selecting the upper portion or the lower portion to be brought into proximity of a RF-ID reader/writer. The RF-ID tags having different functions can be provided to a front side and a back side of the post card. It is also possible that covers made of a material blocking communications are applied on the RF-ID tags so that the user can select a RF-ID tag to be used by opening the cover on it.

It is further possible that photographs are stored in a plurality of servers, and a RF-ID tag holds URLs of the servers. Thereby, a user can access the servers to obtain the photographs to display them in a list.

Moreover, the RF-ID reader/writer may be provided not only to an apparatus (device) such as the TV or the recorder but also to the input means such as a remote controller for operating the apparatus. For instance, if a plurality of apparatuses are connected to one another via a network, an input means for collectively operating the apparatuses may be provided with a RF-ID reader/writer to operate the respective apparatuses. Furthermore, an input means such as a remote controller may be provided with an individual authentication means for biometric authentication such as fingerprint authentication or face authentication, password, or the like. In this aspect, the input means having a RF-ID reader/writer exchanges data with a RF-ID tag, only when the individual authentication is successful. It is also possible that the individual authentication information is previously stored in the RF-ID tag, and individual authentication is performed by the apparatus or the remote controller using the RF-ID tag.

It should be noted that the definition of the term "RF-ID" frequently used in the description of the present invention is not limited to narrow meaning. In general, the term "RF-ID" narrowly refers to a "tag having a nonvolatile memory on which identification information is recorded". RF-ID having a dual interface function or a security function seems commonly called as a "IC card" or the like. However, in the embodiments of the present invention, the "RF-ID" widely refers to an "electronic circuit which has a nonvolatile memory on which individual identification information is recorded and which can transmit the individual identification information to the outside via an antenna".

Conventionally, if a user who is not familiar with operations of an apparatus (device) wishes to perform complicated settings for the apparatus, it is necessary that a seller, repairer, or serviceperson of the apparatus visits a location of the apparatus to perform the settings or controls the apparatus remotely. Even in remotely controlling the apparatus, the seller, repairer, or serviceperson has to visit the location for setting of the remote control. In Embodiment A7 of the present invention, however, the RF-ID card 2100 enables the user to perform the settings of the apparatus (the recorder 2000) without complicated operations. Therefore, even the user not familiar with operations of the recorder can easily change the settings of the recorder.

The present invention can be implemented also as an image presentation method of presenting image related to a communication device on an apparatus (device) having a display screen, in a communication system having (a) the apparatus having the display screen, (b) a reader device connected to the apparatus via a communication path, and (c) the communication device performing proximity wireless communication with the reader device. The present invention can be implemented further as a program stored in the communication device with identification information of the communication device, the program being described by codes executed by a virtual machine included in a device performing proximity wireless communication with the communication device, and being for executing: accessing a server connected via a communication network; downloading, form the server, image associated with the identification information from among image stored in the accessed server; and displaying the downloaded image. In addition, the present invention can be implemented as a computer-readable recording medium such as a CD-ROM on which the above program is recorded.

The communication device according to the present invention may be used, of course, as various devices having a RF-ID unit in which identification information and a virtual machine program are stored. For example, the communication device may be electronic devices such as a camera, home appliances such as a rice cooker and a refrigerator, and daily commodities such as a toothbrush.

FIG. 399 is a block diagram of a configuration where a remote controller of a TV or the like has a RF-ID reader, according to an embodiment of the present invention.

FIG. 400 is a flowchart of processing performed by the above configuration according to the above embodiment.

Here, an embodiment in which a RF-ID reader is provided to a remote controller of a TV or the like is described with reference to diagrams (a) and (b) in FIG. 399, a flowchart (c) in FIG. 399, and a flowchart of FIG. 400.

First, as described earlier, a child device (or child communicator) 5050 such as a camera has the memory (second memory) 52 and the antenna 21. When an antenna 5063*a* of a remote controller 5051 is moved into proximity of the antenna 21, the antenna 5063*a* supplies power to the antenna 21. Thereby, data in the memory 52 is transmitted from the antenna 21 to the antenna 5063*a*. The remote controller 5051 converts the received data into digital data by a communication circuit 5064, and then stores the digital data into a memory 5061 (Step 5001*a* in FIG. 400). Then, a transmission unit of the remote controller 5051 is faced to the TV 45 and a transmission switch 5063 on the remote controller 5051 is pressed (Step 5001*b*). Thereby, the data in the memory 5061 is transmitted as light to a light receiving unit 5058 of the parent device (apparatus) 45 (the TV 45) via a light emitting unit 5062 (Step 5001*c*). The communication may be not light but wireless.

Referring back to a flowchart (c) in FIG. 399, the embodiment of the present invention used in social systems should be applicable even in twenty or thirty years. An example of the program described in a virtual machine language or the like is known Java™. However, such programs are expected to be extended or replaced by totally different programs described in more efficient languages. In order to address the above situation, in the embodiment of the present invention, the parent device 45 such as the TV holds parent device version information 5059 (or parent device version information $n_1$) that indicates a language type or version of a virtual machine language or the like (Step 5060*i* in (c) of FIG. 399). In the beginning of the memory 21 of the child (communication) device 5050, child device version information 5052 (or child device version information $n_2$) indicating a version of a program language or the like for the child device is recorded ((a) in FIG. 399). Following to the child device version information 5052, a program region 5053 is recorded in the memory 52. The program region 5053 stores a program 5056*a* in a version 5055*a*, a program 5056*b* in a version 5055*b*, and a program 5056*c* in a version 5055*c*. Following to the program region 5053, a data region 5054 is recorded in the memory 52.

At Step 5060*i* in the flowchart of FIG. 399, the parent device 45 stores the parent device version information $n_1$ of the parent device 45 is stored. Then, the parent device 45 obtains the child device version information $n_2$ from the memory of the child device (Step 5060*a*). Then, the parent device 45 selects an execution program n having a maximum value of $n_1 \geq n_2$ (Step 5060*b*). The parent device 45 executes the selected execution program (Step 5060*c*). Then, it is determined whether or not the parent device 45 is connected to the Internet (Step 5060*d*). If the parent device 45 is connected to the Internet, then the parent device 45 is connected to the server via the Internet (Step 5060*e*). The parent device 45 thereby transmits language information 5065, which is set in the parent device 45, to the server (Step 5060*f*). The server provides the parent device 45 with a program in the language indicated in the transmitted language information 5065, for example in French, and causes the parent device 45 to execute the program. Alternatively, the server may execute the program on the server itself.

On the other hand, if it is determined at Step 5060*d* that the parent device 45 is not connected to the Internet, then the processing proceeds to Step 5060*h*. At Step 5060*h*, the parent device 45 executes a local program in order to display, on a screen of the parent device 45, attribute information of the child device 5050. The attribute information is, for example, information for notifying a trouble or information regarding the number of stored photographs. As described above, the memory 52 in the child device 5050 holds the child device version information 5052. The memory 52 stores a program, procedure, URL, or the like of each generation. The program, procedure, URL, or the like will be developed every 10 years. Such data format on which information is recorded for each generation can be kept being used even in twenty or thirty years in order to operate the parent device 45. (a) of FIG. 399 illustrates an example of information on which versions or generations of a program are recorded. However, the same advantages are also offered in another example illustrated in (b) of FIG. 399. In (b) of FIG. 86, addresses of data stored in the server are recorded in associated with respective different versions. In this example, a URL 5057*a* in a version 5055*d*, a URL 5057*b* in a version 5055*e*, and a URL 5057*c* in a version 5055*f* are recorded. The above can achieve backward compatibility for many years. For example, it is assumed that a user purchases a product (the parent device 45) in version 1 this year and the product has RF-ID. Under the assumption, it is expected that, in twenty or thirty years, programs described in virtual machine languages or the like such as Java™, which are compliant to versions 1, 2, and 3, will be installed into the parent device 45. In the situation, the child device 5050 can provide the parent device 45 with the child device version information 5052. Based on the child device version information 5052, the parent device 45 can select a program to be compliant to an appropriate version. It is also expected that, in thirty years, the child device will hold information of programs in all versions 1, 2, and 3. Therefore, a different parent device 45 in version 3 employs the best function of a version among them. On the other hand, the former parent device 45 in version 1 employs a rather limited function of a version older than the version employed by the parent device 45 in version 3. As a result, perfect compatibility can be achieved.

The flowchart of FIG. 400 is explained below. At Step 5001*a*, pressing a read switch 5063 on the remote controller 5051, a user brings the remote controller 5051 into proximity of the antenna 21 of the child device 5050. Thereby, data in the memory 52 of the child device 5050 is transmitted to the memory 5061 of the remote controller 5051. Next, at Step 5001*b*, facing the remote controller 5051 to the parent device 45 such as a TV, the user presses a transmission switch 5063 (Step 5001*b*). Thereby, the data in the memory 5061 is transmitted as light to the parent device 45 (Step 5001*c*). In the embodiment of the present invention, the data is referred to as "tag data" for convenience. The parent device 45 extracts or selects an execution program from the tag data (Step 5001*d*). The parent device 45 executes the extracted or selected execution program by a virtual machine language set in the parent device 45 (Step 5001*e*). The parent device 45 reads Internet connection identification information for the parent device 45 (Step 5001*f*). At Step 5001*g*, it is determined whether or not the identification information does not indicate "Connectable to the Internet" (in other words, it is determined based on the identification information whether or not the parent device 45 is connectable to the Internet. If the identification information does not indicate "Connectable to the Internet" until Step 5001, then the parent device 45 executes a non-connectable-state program in the execution program (Step 5001*t*). The non-connectable-state program is to be executed when the parent device 45 is not connectable to the Internet. Then, the parent device 45 displays a result of the execution on its screen (Step 5001*u*). In the embodiment of the present invention, the memory 52 stores not only the information regarding connection to the Internet, but also the non-connectable-state program to be executed when the parent device 45 is not connectable to the Internet. Therefore, the parent device 45 can display a result of a minimum required operation when the parent device 45 is not connectable to the Internet.

On the other hand, if it is determined at Step 5001*g* that the identification information indicates "Connectable to the Internet", then the parent device 45 executes a connection program (Step 5001*h*). The connection program includes a part of the above execution program.

The connection program may be generated by adding, into the execution program in the tag data, data such as a URL of the server, user ID, and a password. More specifically, the added such as a URL of the server, user ID, and a password are added in the data region 5054 illustrated in (a) of FIG. 399. Such connection program can extend the execution program in the tag data, and also reduce a capacity of the nonvolatile memory in the memory 52. In this case, it is also possible that the connection program in the memory 52 is recorded onto a memory such as a non-rewritable ROM in the program region 5053, while the URL of the server and the like are recorded onto the data region 5054 that is rewritable. As a result, a tip area and a cost can be reduced.

At Step 5001*i*, the parent device 45 connects to a server having a specific URL. At Step 5001*j*, it is determined whether or not the server requests the parent device 45 to upload data to the server. If the server requests for uploading of data, then at Step 5001*p*, the parent device 45 uploads data and/or a program to the server. The server executes a program using the data (Step 5001*q*).

The server provides a result of the execution to the parent device 45 (Step 5001*r*). The parent device 45 displays the result and the like of the execution on its screen (Step 5001*s*).

On the other hand, if it is determined at Step 5001*j* that the server does not request for uploading of data, then, the parent device 45 downloads information including a specific program from the server having the URL (Step 5001*k*). The parent device 45 executes the downloaded program (Step 5001*m*). Then, the parent device 45 displays the result of the execution on its screen.

The memory in the RF-ID unit or the child device has a limited capacity due to restriction on power consumption, a volume, or a cost. Therefore, a common program cannot be stored in the memory. However, the use of the connection program and the server as described in the embodiment of the present invention allows an infinitely large program to be executed.

A huge program may be executed on the server. Or, such a program may be downloaded from the server to be executed. These aspects are in the scope of the present invention.

The embodiment described with reference to FIG. 399 has been described to use a remote controller of a TV. In this example, the remote controller has a battery, buttons for switching TV channels, an antenna for reading RF-ID, a communication circuit, and an infrared light emitting unit. The remote controller can be replaced by a mobile phone to produce the same effects as described above. Since mobile phones generally have an infrared light emitting unit, they are easily used instead of remote controllers. In addition, mobile phones have a communication line. Therefore, mobile phones can offer the same capability of that of remote controller, being directly connected to the server. However, a communication cost of a mobile phone is burden of a user. A display screen of a mobile phone is significantly smaller than that of a TV. Therefore, a mobile phone may have the transmission switch 5063 as illustrated in FIG. 399. Thereby, if there is a TV near the mobile phone, the user faces the light emitting unit of the mobile phone to the TV to transmit tag data in the memory 52 of the mobile phone directly to the TV. As a result, the user can view data on a large screen of the TV having a high resolution. The above method does not incur a cost, which is greatly advantageous for the user. The communication using the readout tag data via the mobile phone line is stopped in cooperation with the transmission switch.

In this case, in the same manner as described for as the remote controller with reference to FIG. 399, the mobile phone has at least a reader for RF-ID or a Near Field Communication (NFC) unit. In the future, mobile phones are expected to have a reader function for reading RF-ID or the like. If RF-ID readers are provided to mobile phones, the present invention can be implemented with a much lower additional cost, which is greatly advantageous for the user. Moreover, the present invention can be easily implemented not only as a remote controller or a mobile phone, but also as a Personal Digital Assistance (PDA) terminal, a laptop, or a mobile media player.

[Embodiment A8]

FIG. 401 is a diagram of a network environment.

FIG. 401 illustrates a home network environment assumed in this embodiment. It is assumed that two TVs 45 and 8001 are present in one house, where the TVs 45 and 8001 respectively have RFID tag reader/writers and screen display units 110 and 8003. The TVs 45 and 8001 are respectively connected with video servers 8004 and 8005, enabling video data to be transmitted from the video server to the TV wiredly or wirelessly and displayed by the TV. The video server mentioned here is a storage device such as a NAS unit, or a recording device such as a BD recorder. The TVs 45 and 8001 can also access a video server outside the house via the Internet. It is further assumed that the user of the home network has a mobile AV terminal 8006 that is portable and capable of displaying video. Like the TVs, the mobile AV terminal 8006 has a RFID tag 8007 and a video display unit 8008, and can access a video server wirelessly.

In this embodiment, consider a situation where, under the above-mentioned environment, the user who is watching video on the TV 1 (45) wants to watch it on the TV 2 (8001) upstairs. In the case of moving to another place to watch the video, it is desirable that the user can watch the video seamlessly from the point up to which the user has already watched. However, in order to seamlessly move the video while maintaining security, user authentication and timing synchronization are necessary, and the user is required to perform complex operations.

To solve the above problem, processing such as user authentication and timing synchronization is performed by extremely simple information exchange through the use of RFID, in this embodiment of the present invention. In detail, the RFID tag 8007 of the mobile AV terminal 8006 is brought into proximity of the RFID tag 46 of the TV 1, to exchange information for authentication and timing synchronization through the RFID tag.

In this embodiment of the present invention, according to the above structure, video passing can be performed by an extremely simple operation of causing the mobile AV terminal and the TV touch each other, thereby significantly improving user-friendliness.

FIG. 402 is a functional block diagram of each function executed by the mobile AV terminal 8006.

To perform video passing, the user presses a video passing button 8050. When the video passing button 8050 is pressed, a video passing request generation unit 8051 obtains video information currently displayed by the video display unit 8008 from a display information management unit 8052, generates a video passing request, and writes the video passing request to a memory 8054 of the RFID unit. In the case where no video is being displayed, the mobile AV terminal 8006 enters a video get mode, and the video passing request generation unit 8051 generates the video passing request including a video get command. In the case where video is being displayed, the mobile AV terminal 8006 enters a video give mode, and the video passing request generation unit 8051 generates the video passing request including a video give command and video information. The video information mentioned here includes video display time information managed in the display information management unit 8052 and connection destination information managed in a communication and broadcast management unit 8055. When receiving video via a broadcast interface 8056, the communication and broadcast management unit 8055 manages channel information. When receiving video via a communication interface 8057, the communication and broadcast management unit 8055 manages an identifier of a video server and an identifier of video. The identifier of the video server and the identifier of the video may be any identifiers uniquely identifying the video server and the video, such as an IP address and a URL. Note that the video passing button may be provided separately as a video get button and a video give button. Moreover, selection of whether to get or give video may be displayed on the screen when the video passing button is pressed. When another RFID tag is brought into proximity, information stored in the memory 8054 in the RFID unit is transmitted from a transmission unit 8058 via a wireless antenna 8059. In the case where no transmission is made within a predetermined time after the generation of the video passing command, the video passing mode is cancelled, and the information in the memory is discarded. A receiving unit 8060 in the RFID unit receives a video passing response. The video passing response is a response indicating whether or not the video get command or the video give command is accepted. In the case where the video passing response indicates that the video get command is accepted, the video passing response includes video information. The video passing response is outputted to the communication and broadcast management unit 8055, and the communication and broadcast management unit 8055 performs processing according to the video passing response. In the case where the video passing response indicates that the video get command is accepted, the communication and broadcast management unit 8055 performs video get processing. In the case where the video information included in the video passing response is channel information, the communication and broadcast management unit 8055 notifies the broadcast interface 8056 of the channel information, to receive data of a channel designated by the channel information. The communication and broadcast management unit 8055 also instructs a display management unit 8061 to display the data of the channel. In the case where the channel information designates a channel (a channel of BS, CS, or cable TV) that is not receivable by the broadcast interface 8056 of the mobile AV terminal 8006, the communication and broadcast management unit 8055 requests a communication unit 8062 to search for a terminal that is capable of receiving data of the channel and transferring it to the communication interface 8057. Note that the search for the terminal that serves to transfer the data of the channel may be performed beforehand. Even when the data of the channel is received by the communication interface 8057, the data of the channel is displayed by the video display unit 8008 in the same way as in the normal case. In the case where the video information included in the video passing response is connection destination information, the communication and broadcast management unit 8055 notifies the communication unit 8062 of the connection destination information, to transmit a video transmission request to a connection destination. The video transmission request includes a video display time, and data transmission is requested according to this time. Note that, unlike video reception by the broadcast interface 8056, video reception by the communication interface 8057 may take some time. This depends on preprocessing for receiving video data by the communication interface 8057 and a time period during which video data is temporarily stored in a communication buffer 8063. In the method of this embodiment, unnecessary data transmission and a waiting time associated with it may be reduced by predicting such a time beforehand and issuing the video transmission request from the communication unit 8062 on the basis of the predicted time. In this case, a display time correction unit 8064 performs correction so that video can be displayed seamlessly. This is possible because data of digital video is typically stored in a display buffer 8065 and displayed by the video display unit 8008 while being processed by a display processing unit 8053. On the other hand, in the case where the video passing response indicates that the video give command is accepted, screen display is cleared. Note that the screen display may be automatically cleared, or whether or not to clear the screen display may be selected by the user. Alternatively, the screen display may be cleared upon receiving a screen display clearing instruction from the terminal to which video is passed. Moreover, a timer may be provided so that the screen display is cleared after a predetermined time has elapsed.

FIG. 403 is a functional block diagram of each function executed by the TV.

A receiving unit 8101, upon receiving a video passing request from an antenna 8100 of a RFID tag, outputs the video passing request to a communication and broadcast management unit 8102. In the case where the received video passing request is a video get command, the communication and broadcast management unit 8102 outputs managed connection destination information of displayed video, to a video passing response generation unit 8103. Upon receiving the connection destination information, the video passing response generation unit 8103 obtains display time information from a display information management unit 8104, generates a video passing response, and writes the video passing response in a memory 8105 in the RFID unit. Here, when the video passing response generation unit 8103 cannot obtain desired information, the video passing response generation unit 8103 generates the video passing response indicating that the video passing request is rejected. A transmission unit 8106 transmits the written video passing response to the RFID unit of the mobile AV terminal 8006. Video display termination processing after transmission is the same as in the mobile AV terminal 8006. In the case where the received video passing request is a video give command, on the other hand, the communication and broadcast management unit 8102 performs processing according to information included in the video passing request. In the case where channel information is included in the video passing request, the communication and broadcast management unit 8102 notifies a broadcast interface 8107 of the channel information, to receive data of a desired channel designated by the channel information. The communication and broadcast management unit 8102 then notifies a display management unit 8108 of the data of the channel, thereby changing the display. In the case where the video giving command is received while video is being displayed, determination of which video is to be prioritized may be made by a video priority determination unit 8109, or a selection command may be displayed. In the case where connection destination information is included in the video passing request, the communication and broadcast management unit 8102 notifies a communication unit 8110 of the connection destination information, to transmit a video transmission request. Subsequent processing is the same as in the mobile AV terminal. Moreover, the functions of the other units are the same as those in the mobile AV terminal.

FIG. 404 is a sequence diagram in the case where, when the TV 1 (45) is receiving video from the video server 1 (8004), the video is passed to the mobile AV terminal 8006.

To perform video passing, the user powers on the mobile AV terminal 8006. The mobile AV terminal 8006 searches for an access point 8009 of the wireless LAN, and establishes wireless connection. The mobile AV terminal 8006 also obtains an IP address by DHCP or the like, and establishes IP connection. In the case where the mobile AV terminal 8006 is a DLNA terminal, DLNA terminal search processing such as M-SEARCH may be performed. The user presses the video passing button, to generate a video passing request in the memory in the RFID unit. The user further brings the RFID tag 8007 of the mobile AV terminal 8006 into proximity of the RFID tag reader/writer 46 of the TV 1, to transmit the video passing request to the TV 1. Upon receiving the video passing request, the TV 1 generates a video passing response (including an IP address of the video server 1, a video identifier, and a video display time), and returns the video passing response to the mobile AV terminal 8006. It is assumed here that the TV 1 obtains the IP address of the video server 1 beforehand, even when the video receiving means of the TV 1 has no IP connection such as a HDMI cable. In the case where the video is in encrypted form, necessary security-related information (such as a key) is exchanged at the same time. Upon receiving the video passing response, the mobile AV terminal 8006 transmits a video transmission request (including the video identifier and the video display time) to the IP address of the video server 1 included in the video passing response. Upon receiving the video transmission request, the video server 1 (8004) switches a video transmission destination to the mobile AV terminal 8006. Having no longer received the video data, the TV 1 (45) turns video display OFF.

FIG. 405 is a sequence diagram in the case where, when the mobile AV terminal 8006 is receiving the video from the video server 1 (8004), the video is passed to the TV 2 (8003).

The user presses the video passing button of the mobile AV terminal 8006, to generate a video passing request (including the IP address of the video server 1, the video identifier, and the video display time). The user further brings the RFID tag 8007 of the mobile AV terminal 8006 into proximity of a RFID tag reader/writer 8002 of the TV 2, to transmit the video passing request to the TV 2. The TV 2 (8003) generates a video passing response indicating that the video passing request is accepted, and returns the video passing response to the mobile AV terminal 8006. The TV 2 (8003) transmits a video transmission request to the video server 1 (8004). Subsequent processing is the same as in FIG. 404.

FIG. 406 is a flowchart of processing of the mobile AV terminal 8006.

When the user presses the video passing button (S8300), the mobile AV terminal 8006 enters a video get mode (S8302) in the case where the screen is blank (or has no video display) (S8301). In the case where the screen is not blank, a selection screen is displayed (S8303). When the user selects "get" (S8304), the mobile AV terminal 8006 equally enters the video get mode. When the user selects "give", the mobile AV terminal 8006 enters a video give mode (S8305). In the video get mode, the mobile AV terminal 8006 stores a video passing request including a video get command in the memory 8105 in the RFID unit. The user brings the RFID unit of the mobile AV terminal 8006 into proximity of the RFID unit of the other terminal (S8306), to transmit the video passing request to the other terminal (S8307). Upon receiving a video passing response from the other terminal (S8308), the mobile AV terminal 8006 performs processing according to information included in the video passing response. In the case where no response is obtained, the mobile AV terminal 8006 displays an error screen indicating no response, and ends processing (S8309). In the case where terrestrial channel information is included in the video passing response, the mobile AV terminal 8006 determines whether or not the mobile AV terminal 8006 is capable of receiving the corresponding channel (that is, whether nor not the mobile AV terminal 8006 has a tuner and an antenna and is in a terrestrial wave receivable range). In the case where the mobile AV terminal 8006 is capable of receiving the channel (S8311), the mobile AV terminal 8006 displays data of the designated channel. In the case where the mobile AV terminal 8006 is not capable of receiving the channel, the mobile AV terminal 8006 enters a wireless LAN transfer mode (S8313). Likewise, in the case where channel information of BS or the like, which is basically not receivable by the mobile AV terminal 8006, is included in the video passing response (S8314), the mobile AV terminal 8006 enters the wireless LAN transfer mode. On the other hand, in the case where no channel information is included in the video passing response, the mobile AV terminal 8006 enters a wireless LAN receiving mode (S8315).

FIG. 407 is a flowchart of processing of the mobile AV terminal 8006 in the video give mode.

In the video give mode, the mobile AV terminal 8006 stores a video passing request including a video give command and information of video to be given, in the memory 8054 in the RFID unit. The user brings the RFID unit of the mobile AV terminal 8006 into proximity of the RFID unit of the other terminal (S8320), to transmit the video passing request to the other terminal (S8321). Upon receiving a video passing response from the other terminal (S8322), the mobile AV terminal 8006 performs processing according to information included in the video passing response. In the case where no response is obtained, the mobile AV terminal 8006 displays an error screen indicating no response, and ends processing (S8323). In the case where the video passing response indicates that video passing is disabled (S8324), the mobile AV terminal 8006 displays an error screen indicating that video passing is disabled, and ends processing (S8325). In the case where video passing is enabled and video to be passed is being received via terrestrial wave (S8326), the mobile AV terminal 8006 stops screen display of terrestrial broadcasting. Otherwise, the mobile AV terminal 8006 performs termination processing of video that is being received via wireless LAN, according to a type of corresponding receiving system (S8327). The mobile AV terminal 8006 thereby stops screen display. Note that the screen display may be stopped according to an instruction from the terminal on the video give side, or the screen display may be switched to another screen such as an initial screen (S8328).

FIG. 408 is a flowchart of processing of the mobile AV terminal 8006 in the wireless LAN transfer mode.

The mobile AV terminal 8006 is assumed to be a terminal that is capable of receiving terrestrial wave but is not capable of receiving satellite broadcasting and cable TV broadcasting. To receive such broadcast wave, the broadcast wave needs to be received by another terminal capable of receiving the broadcast wave, and transferred to the mobile AV terminal 8006 via wireless LAN. In the wireless LAN transfer mode, the mobile AV terminal 8006 calls information of a wireless LAN transfer capable apparatus. In the case where the information of the wireless LAN transfer capable apparatus is not held in the mobile AV terminal 8006 (S8340), the mobile AV terminal 8006 searches for the wireless LAN transfer capable apparatus (S8341). In the case where the wireless LAN transfer capable apparatus cannot be found in the house, the mobile AV terminal 8006 displays an error screen indicating that channel passing is disabled (S8342). In the case where the wireless LAN transfer capable apparatus is found or the information of the capable apparatus is held in the mobile AV terminal 8006, the mobile AV terminal 8006 transmits a video transfer request for the channel, to the wireless LAN transfer capable apparatus (S8344). In the case where a video transfer enable response is returned from the wireless LAN transfer capable apparatus, the mobile AV terminal 8006 receives video packets of the designated channel via wireless LAN (S8345), and displays the video of the designated channel (S8346).

FIG. 409 is a flowchart of processing of the mobile AV terminal 8006 in the wireless LAN receiving mode.

In the wireless LAN receiving mode, in the case where the video passing response includes an IP address of a video server and an ID and display time information of video (S8360), the mobile AV terminal 8006 accesses the video server. First, the mobile AV terminal 8006 determines whether or not the IP address of the video server is in the same subnet as the IP address of the mobile AV terminal 8006 (S8361). In the case where the IP address of the video server is in the same subnet as the IP address of the mobile AV terminal 8006, the mobile AV terminal 8006 transmits a video transmission request including the video ID and display time, to the video server (S8364). Note that, in the case where a delay time correction function is available (S8362), the mobile AV terminal 8006 corrects the display time information in the video transmission request (S8363). Here, the display time correction function denotes a correction function that is executed to perform efficient video transfer in consideration of various delay in processing. In the case where video cannot be received from the video server (S8365), the mobile AV terminal 8006 may retransmit the video transmission request. In the case where there is no response even after a predetermined retransmission timeout occurs (S8366), the mobile AV terminal 8006 displays an error screen indicating no server response (S8367). In the case where the time of the received video data does not coincide with the time of display (S8368), the mobile AV terminal 8006 adjusts the time to the time of display using a control packet for fast-forward or rewind (S8369). The mobile AV terminal 8006 then displays video.

FIG. 410 is a flowchart of processing in the case where a URL is included in the video passing response.

In the case where the URL is included (S8380), the mobile AV terminal 8006 performs name resolution by DNS, to obtain the IP address of the video server (S8381). Note that the URL for video may be any name assigned for video service. The name resolution also includes conversion to a terminal identifier from a service identifier other than DNS. In the case where the obtained IP address of the video server is the same as the IP address of the mobile AV terminal 8006, the mobile AV terminal 8006 returns to the processing described in FIG. 409. In the case where the IP address of the video server is not in the same subnet as the IP address of the mobile AV terminal 8006, the mobile AV terminal 8006 proceeds to connection processing to a server outside the subnet. In the case where the desired information is not included in the video passing response, the mobile AV terminal 8006 displays an error screen indicating that the video passing response is invalid.

FIG. 411 is a flowchart of processing in the case where the IP address of the video server is not in the same subnet as the IP address of the mobile AV terminal 8006.

In the case where the IP address of the video server is in a different subnet, the mobile AV terminal 8006 searches for another wireless access point. In the case where there is no other access point in the house, the mobile AV terminal 8006 determines that the video server is an external server, and proceeds to external server connection processing. In the case where there is another access point (S8390), the mobile AV terminal 8006 performs reconnection to the access point, and obtains another IP address of a subnet (S8391). In the case where the subnet of the video server is the same as the subnet of the obtained IP address (S8392), the mobile AV terminal 8006 proceeds to home server processing. In the case where the subnet of the video server is not the same as the subnet of the IP address obtained by connecting to the accessible access point in the house (S8393), the mobile AV terminal 8006 proceeds to external server access processing. Note that the mobile AV terminal 8006 may perform IP address obtainment processing for all access points beforehand and manage the processing result therein.

FIG. 412 is a flowchart of processing in the case of accessing an external server.

In the case where the address of the video server is not a global address (S8400), the mobile AV terminal 8006 displays an error screen indicating an address error (S8401). In the case where an access method to the designated video server is unknown (S8402), the mobile AV terminal 8006 displays an error screen indicating that the access method is unknown (S8403). Note that a home video server and a home video appliance are assumed to be compliant with DLNA. In the case where the access method is known and also the video server has the same function as a home server, the mobile AV terminal 8006 performs the same processing as in the case of a home server (S8404). Otherwise, the mobile AV terminal 8006 performs processing according to the access method to obtain video (S8405), and displays the received video (S8406).

FIG. 413 is a flowchart of processing of the TV.

When the RFID unit of the other terminal is brought into proximity of the RFID unit of the TV (S8410), the TV receives a video passing request (S8411). In the case where the TV is receiving video (S8412) and also a video get command is included in the video passing request (S8413), the TV enters a video give mode (S8414). In the case where the TV is not receiving video but the video get command is included in the video passing request (S8415), the TV returns a video passing response indicating that video passing is disabled (S8416), and displays an error screen indicating that video passing is disabled (S8417). In the case where the video is being received via terrestrial wave (S8418), the TV returns the video passing response including channel information (S8419). The TV then clears screen display (S8420).

FIG. 414 is a flowchart of processing in the case where the video is being received not via terrestrial wave.

In the case where the video being received is broadcast video other than terrestrial wave (S8430), the TV returns the video passing response including channel information. In the case of a wireless LAN transfer mode, the TV may include the IP address of the TV in the video passing response (S8431). After returning the response, the TV clears screen display (S8432). In the case of other video, the TV returns the video passing response including an IP address of a video server, a video ID, and a video display time, or including a video URL and a video display time (S8433). After this, the TV performs termination processing of video communication via wireless LAN (S8434), and clears screen display.

FIG. 415 is a flowchart of processing in the case where a video give command is included in the video passing response.

When the TV receives the video give command while displaying video, the TV enters a video get mode (S8441) in the case where a double screen display function is available (S8440). In the case where the double screen display function is not available, the TV displays a selection screen of whether or not to get video (S8442). When the user selects to get video (S8443), the TV enters the video get mode. When the user selects not to get video, the TV returns a video passing response indicating that video passing is disabled (S8444). In the case where channel information is included in the video passing request (S8445), the TV displays data of a designated channel (S8446). In the case where an IP address of a video server or a URL is included in the video passing request (S8447, S8448), the TV performs the same processing as in the video get mode of the mobile AV terminal. In the case where such information is not included in the video passing request, the TV displays an information error screen (S8449).

[Embodiment A9]

FIG. 416 is a sequence diagram in the case where, when the TV 1 (45) is receiving video from the video server 1 (8004), the TV 1 (45) transmits a video transmission request so that the mobile AV terminal 8006 gets the video.

As in FIG. 404, the user powers on the mobile AV terminal 8006 to pass the video. The mobile AV terminal 8006 searches for the access point 8009 of wireless LAN, and establishes wireless connection. The mobile AV terminal 8006 also obtains an IP address by DHCP or the like, and establishes IP connection. The user presses the video passing button, to generate a video passing request in the memory in the RFID unit. Here, the video passing request includes the IP address of the mobile AV terminal 8006. The user further brings the RFID tag 8007 of the mobile AV terminal 8006 into proximity of the RFID tag reader/writer 46 of the TV 1, to transmit the video passing request to the TV 1 (45). The TV 1 returns a video passing response including the IP address of the video server, to the mobile AV terminal 8006. This step is intended to enhance security (to prevent arbitrary access from an irrelevant terminal), and may be omitted. As in FIG. 404, in the case where video is in encrypted form, necessary security-related information (such as a key) is exchanged at the same time. Upon receiving the video passing request, the TV 1 (45) transmits a video transmission request including the IP address of the mobile AV terminal 8006, to the video server 1 (8004). Upon receiving the video transmission request, the video server 1 (8004) switches a video transmission destination to the mobile AV terminal 8006. Subsequent processing is the same as in FIG. 404.

FIG. 417 is a sequence diagram in the case where, in the same situation as in FIG. 405, the IP address of the video server 1 (8004) is included in a video passing request.

This may be omitted as in FIG. 415. Upon receiving the video passing request, the TV 2 (8003) returns a video passing response including the IP address of the TV 2. Upon receiving the video passing response, the mobile AV terminal 8006 transmits a video transmission request including the IP address of the TV 2, to the video server 1 (8004). Upon receiving the video transmission request, the video server 1 (8004) changes the video transmission destination to the TV 2 (8003). Subsequent processing is the same as in FIG. 404.

[Embodiment A10]

FIG. 418 is a sequence diagram in the case where a remote controller 8200 having a RFID unit is used instead of the mobile AV terminal 8006.

Here, the remote controller is assumed to be a terminal that does not have a display unit but has a transmission and reception unit and a memory of a RFID unit. The user presses a video passing button, to generate a video passing request in the memory in the RFID unit. The user further brings the RFID unit of the remote controller 8200 into proximity of the RFID unit 46 of the TV 1, to transmit the video passing request to the TV 1. Upon receiving the video passing request, the TV 1 generates a video passing response (including the IP address of the video server 1, a video identifier, and a video display time), and returns the video passing response to the remote controller 8200. Moreover, upon receiving the video passing request from the remote controller 8200, the TV 1 (45) transmits a video stop request to the video server 1 (8004). After going upstairs, the user brings the RFID unit of the remote controller 8200 into proximity of the RFID unit of the TV 2, to transmit a video passing response (including the IP address of the video server 1, the video identifier, and the video display time). Upon receiving the video passing request, the TV 2 (8003) returns a video passing response, and transmits a video transmission request (including the video identifier and the video display time) to the video server 1. The video server 1 (8004) starts transmitting the designated video from the designated time.

[Embodiment A11]

FIG. 419 is a sequence diagram in the case where the video server 1 is capable of synchronous transmission.

After conducting predetermined communication with the TV 1, the mobile AV terminal transmits a video transmission request to the video server 1. Upon receiving the video transmission request, the video server 1 (8004) temporarily transmits video data to both the TV 1 (45) and the mobile AV terminal (8006). This processing is intended to achieve complete seamlessness. The mobile AV terminal and the TV 1 may both display the video temporarily, or some kind of synchronization processing may be performed to achieve complete seamlessness. The video server 1 (8006) stops video data transfer to the TV 1, on the basis of a video stop request from the mobile AV terminal (8006). Note that the TV 1 (45) may transmit the stop request, or the video server 1 (8006) may automatically stop video data transfer.

[Embodiment A12]

This embodiment relates to a best mode of a method for ensuring traceability in a distribution form from factory shipment to use environment of an apparatus (device) provided with a RFID tag as described in Embodiments A1 to A10.

Recently, given a need to improve distribution efficiency and also an increase in number of accidents caused by aging of home electrical products, there has been debate for ensuring traceability, namely, an ability to trace from manufacture and distribution through to a use environment by a consumer.

As an example, an attempt has been made to enable management from manufacture to distribution to a retailer, by adding a passive RFID tag that uses a communication frequency in a band of 860 to 900 MHz, to a package, a returnable container, or the like. The band of 860 to 900 MHz is also called a UHF (UltraHigh Frequency) band. The RFID tag in the UHF band can exhibit a largest communication distance in the passive type (i.e., the type of tag to which power is supplied from outside), and is capable of communication of 2 to 3 m though depending on output magnitude. Accordingly, by simultaneously passing a plurality of products through a RFID reader gate during transportation, RFID information of the plurality of products can be instantly read with efficiency. Hence, the RFID tag is particularly expected to be used in the field of distribution.

However, such a RFID tag of the UHF band has the following problem. Though the RFID tag certainly has an advantage of long-distance communication, the apparatus cannot be traced once it has been delivered to the consumer because the RFID tag is added to the package or the returnable container. Besides, the long-distance feature is not particularly effective in an entity interface, an object interface, or an intuitive interface described in Embodiments A1 to A10 where apparatuses are brought into proximity of each other to trigger an action.

Meanwhile, the RFID tag (47) described in Embodiments A1 to A10 is assumed to be a HF-RFID tag in a band of 13.56 MHz (though this is not a limit for the present invention). HF-RFID has a feature of short-distance communication (within about several ten cm though depending on output). For instance, the HF-RFID tag is widely used in applications that intuitively trigger an action by bringing two terminals close to each other, such as electronic money and ticket gate systems. This being so, for example when the user wants to display photographs captured by a digital camera on a TV, the user brings the digital camera 1 close to the RFID reader/writer 46 of the TV, thereby realizing an entity interface where an entity (camera) and an entity (TV) operate in conjunction with each other or an intuitive interface where digital camera photographs are displayed on the TV.

In this embodiment, the HF-RFID tag is added to the apparatus (device) as in Embodiments A1 to A10, and also the UHF-RFID tag is added to the package or the returnable container of the apparatus, to ensure product traceability even after the product is reached the use environment of the consumer.

FIG. 420 is a schematic diagram illustrating processing of HF-RFID and UHF-RFID upon apparatus factory shipment.

Though this embodiment describes the case where the apparatus is a recorder, the apparatus is not limited to such and may be any of a digital home appliance, a food, and the like.

An apparatus M003 assembled in a manufacturing line is provided with a HF-RFID tag M001. The HF-RFID tag M001 has a memory, which has a structure of a dual interface that is accessible from both the apparatus M003 and a communication unit of the RFID tag M001. A product serial number of the apparatus and a program (command) for copying the product serial number of the apparatus to the UHF-RFID tag are stored in the memory of the HF-RFID tag M001, in an assembly stage.

After the assembly of the apparatus M003 is completed, prior to packaging, a handy reader/writer M002 reads the product serial number from the memory of HF-RFID, and also records a device ID of UHF-RFID (UHF-RFID unique information) indicating that the UHF-RFID tag is added to the package or the like.

Next, having packaged the apparatus M003, a UHF-RFID tag M005 is added to a package M004. The UHF-RFID tag M005 may be directly added to the package, or may be added to a management table or the like. After adding the UHF-RFID tag M005, the handy reader/writer M002 records the product serial number and the like read from the HF-RFID tag M001 of the apparatus M003, to the UHF-RFID tag M005. In this embodiment, the handy reader/writer M002 is capable of accessing both HF-RFID and UHF-RFID.

Thus, the product serial number of the apparatus M003 is recorded on the HF-RFID tag M001, and the same information is also recorded on the UHF-RFID tag M005 of the package M004. Therefore, in distribution after packaging, there is no need to read the product serial number and the like from the HF-RFID tag that is capable of only short-distance access. By simultaneously passing a plurality of products through the gate, the information can be directly read from the UHF-RFID tag. This contributes to more efficient distribution.

Moreover, after the apparatus M003 reaches the use environment of the consumer, the HF-RFID tag can be read by a remote controller of a TV and the like. Hence, not only the distribution but also the apparatus reaching the consumer can be traced. As a result, overall traceability that contributes to improved distribution efficiency and prevents accidents caused by aged deterioration during apparatus use can be achieved.

FIG. 421 is a schematic diagram illustrating a recording format of a memory accessible from the UHF-RFID tag M005.

The memory of the UHF-RFID tag M005 stores a UHF device ID 1070, HF existence identification information 1071, an apparatus product serial number and actual article number 1072, a date 1073, a manufacturer 1074, a model number, lot number, and product name 1075, and a status 1076.

The UHF device ID 1070 is stored in a non-rewritable area of the memory, and is identification information for uniquely identifying the UHF-RFID tag. The UHF device ID 1070 is read by the handy reader/writer before the apparatus M003 is packaged, and recorded in the HF-RFID tag M001. Hence, even when the correspondence relation between the package and the apparatus is wrong, the correspondence relation can be checked beforehand and appropriate processing can be performed.

The HF existence identification information 1071 is identification information for determining whether or not the HF-RFID tag M001 is added to the apparatus M003. In the case where the HF-RFID tag M001 is added to the apparatus M003, when recording the product serial number and the like read from the HF-RFID tag M001 to the UHF-RFID tag M005 upon apparatus packaging, the HF-RFID existence identification information is changed to information indicating "exist". This makes it possible to determine whether or not to check the correspondence relation between UHF-RFID and HF-RFID, by referencing only the HF existence identification information 1071.

The apparatus product serial number and actual article number 1072 is at least one of the product serial number read from the HF-RFID tag M001 and an actual article number associated with the product serial number. The actual article number is a number of the apparatus used in the distribution process. It is possible to uniquely associate the actual article number with the product serial number, by equally managing the product serial number and the actual article number. Accordingly, in this embodiment, the product serial number and the actual article number are not clearly distinguished from each other but are described as the same information.

The date 1073 corresponds to a manufacturing year/month/date, and information of a date and time of manufacture of the apparatus M003 is recorded as the date 1073. This information may be recorded by the handy reader/writer M002 at the time of recording the product serial number to the UHF-RFID tag M005, or manufacturing year/month/date information stored in the HF-RFID tag M001 may be read and recorded to the UHF-RFID tag M005.

The manufacturer 1074 is identification information of a manufacturer of the apparatus M003. This information may be recorded by the handy reader/writer M002 at the time of recording the product serial number to the UHF-RFID tag M005, or manufacturer information stored in the HF-RFID tag M001 may be read and recorded to the UHF-RFID tag M005.

The model number, lot number, and product name 1075 may be recorded by the handy reader/writer M002, or the corresponding information may be read from the HF-RFID tag M001 and recorded, in the same way as the date 1073 and the manufacturer 1074. Regarding the lot number, in the case where lot management from manufacture to distribution can be conducted in a unified fashion, the information may be written by any of the two methods. However, in the case where unified management is not conducted and manufacturing line information is unclear upon packaging, reading the lot number from the HF-RFID tag M001 and recording it to the UHF-RFID tag M005 is more advantageous because stricter management can be achieved.

The status 1076 is status information in the distribution form. That is, status information necessary for tracing the apparatus, such as factory storage, factory shipment, distribution center reception, distribution center shipment, and retailer reception, is recorded as the status 1076. The status 1076 is rewritable in each distribution process.

Moreover, the UHF-RFID tag M001 stores management server specific information 1077. The management server specific information 1077 is the same information as the server specific information 48 in the second memory 52 of the HF-RFID tag M001. When packaging the apparatus M003, the server specific information is read from the HF-RFID tag M001 and copied to the UHF-RFID tag M005. This enables unified management to be performed by the same management server for both of the management in the distribution stage using UHF-RFID and the management after the apparatus is delivered to the consumer.

Therefore, after the apparatus M003 is delivered to the consumer, by reading the management server address information from the HF-RFID tag M001, accessing the management server, and making an inquiry by the apparatus product serial number 1072, trace information from manufacture to distribution managed by the management server can be visualized to the consumer. This enhances consumer assurance and safety.

FIG. 422 is a flowchart illustrating a flow of processing of copying the product serial number and the like to the UHF-RFID tag M005 from the HF-RFID tag M001 upon factory shipment of the apparatus M003.

First, the HF-RFID tag M001 is added to the assembled product (the apparatus M003) (1080). This flowchart shows an example where the HF-RFID tag is added after the assembly of the apparatus M003. However, in the case of a structure of a dual interface where the apparatus and the HF-RFID tag can both access a shared memory, the HF-RFID tag M001 is added to the apparatus M003 during assembly of the apparatus M003.

Next, the product serial number of the apparatus M003 is recorded on the HF-RFID tag 1081 (1081). This is a step of recording the product serial number on the HF-RFID tag M001 in the assembly process through the handy reader/writer M002. The product serial number is obtained from a management server of the manufacturing line using the handy reader/writer or the like, and recorded on the HF-RFID tag M001 by proximity wireless communication.

After the product serial number is recorded on the HF-RFID tag M001, the apparatus M003 is packaged (1082). The packaging mentioned here denotes packaging for distribution with a cushioning material and the like, or containment into a returnable container and the like.

After completing the packaging, the UHF-RFID tag M005 is added to the package (including a returnable container surface, a management label, and so on) (1083).

Following this, the handy reader/writer M002 communicates with a management server 1085, thereby reading the actual article number associated with the product serial number read from the HF-RFID tag M001 (1084). The actual article number is a management number used in product distribution, and is issued by the management server. The actual article number is in a one-to-one correspondence with the product serial number.

After the actual article number is read from the management server 1085, the product serial number or the actual article number, and the existence identification information indicating that the HF-RFID tag M001 is added to the apparatus M003, are recorded on the UHF-RFID tag M005 (1086).

As a result of the above processing, the product serial number recorded on the HF-RFID tag M001 which is added to the apparatus M003 is copied to the UHF-RFID tag M005 after apparatus packaging. Typically, the communicable distance of the HF-RFID tag is short, and so it is difficult to access the HF-RFID tag after packaging. In this embodiment, however, the product serial number or the actual article number is recorded on the UHF-RFID tag that has a longer communicable distance than the HF-RFID tag and is added to the package. This allows for apparatus distribution management after packaging.

Moreover, even if the package or the like is discarded after the apparatus is delivered to the consumer, the product serial number and the like can be read by accessing the HF-RFID tag added to the apparatus. Thus, unified management from distribution to consumer use can be achieved, which contributes to traceability over a wide range.

FIG. 423 is a flowchart illustrating a flow of processing in the distribution process of the apparatus M003.

First, upon factory shipment of the apparatus M003, the product serial number or the actual article number is read from the UHF-RFID tag M005 by using a handy reader/writer or passing the product through a UHF-RFID reader gate. Shipment completion is registered in the management server 1085 that can communicate with the handy reader/writer or the UHF-RFID reader gate, and also the UHF-RFID tag M005 is accessed from the handy reader/writer or the UHF-RFID reader gate to rewrite the status (1076) in the memory of the UHF-RFID tag M005 to indicate shipment completion (1090).

After factory shipment, the product is retained in the distribution center or the like. Upon subsequent shipment from the distribution center, the product serial number or the actual article number is read from the UHF-RFID tag M005 by a handy reader/writer or a UHF-RFID reader gate, and distribution center shipment completion is registered in the management server 1085 and also the status (1076) in the UHF-RFID tag M005 is rewritten to indicate distribution center shipment completion (1092).

Likewise, upon retailer shipment, retailer shipment completion is registered in the management server 1085, and the status 1076 in the UHF-RFID tag M005 is rewritten to indicate retailer shipment completion (1094).

Lastly, when the apparatus M003 reaches the consumer, the product serial number is read from the HF-RFID tag M001 by the reading unit of the RF-ID reader/writer 46 of the TV remote controller or the like, and registered in the management server 1085 in association with TV identification information (1096). Accordingly, in this embodiment too, the server specific information 48 is recorded in the second memory 52 of HF-RFID beforehand. The server specific information 48 in this embodiment indicates the management server 1085, and includes a URL for connecting to the management server 1085. Hence, by reading the HF-RFID tag M001 of the apparatus M003 using the TV remote controller or the like having the RF reader/writer, management information from manufacture to distribution can be obtained from the management server 1085. In addition, by managing the product serial number in association with the TV identification information in the management server 1085, it is possible to store a list of apparatuses possessed by the user in the management server in association with the user's TV, without managing personal information of the user.

When the user's apparatus has a problem, a message warning the user is adequately displayed on the TV, with it being possible to prevent a serious accident.

As described above, according to this embodiment, in the manufacturing stage the apparatus and the package are respectively provided with the HF-RFID tag and the UHF-RFID tag, which each carry existence identification information of the other tag. Moreover, the product serial number and the management server specific information stored in the HF-RFID tag are copied to the UHF-RFID tag. As a result, it is possible to provide a system in which management can be performed even after the apparatus reaches the consumer while maintaining distribution management convenience, unlike a conventional system where traceability is attained only during distribution.

Though this embodiment describes management from manufacture to delivery to the user, the present invention has the same advantageous effects even when the user discards or recycles the apparatus. A procedure in this case can be realized in the same way as in this embodiment.

For example, in FIG. 420, upon factory shipment, the product serial number and the like recorded on the HF-RFID tag M001 added to the apparatus M003 are copied to the UHF-RFID tag M005 added to the package M004 after packaging. The same applies to shipment to a disposal facility or shipment to a recycling center, other than factory shipment. In the case of shipment to a disposal facility, after disposal completion, disposal completion is registered in the management server. This enables unified management to be performed while the product is manufactured, used by the consumer, and put into disposal. Recently, there is a problem of illegal disposal due to disposal cost. However, referencing HF-RFID or UHF-RFID of an illegally disposed apparatus makes it instantly clear in which part of the distribution stage the illegal disposal has been conducted. Thus, the problem of illegal disposal can be alleviated according to this embodiment.

In the case of shipment to a recycling center, since use status information, a problem detection status, a total use time, and the like detected by the use status detection unit 7020 are recorded in an area accessible from the HF-RFID tag, such information can be used for determination of whether or not the apparatus is recyclable, price determination, and so on. When the apparatus is determined as recyclable, information such as TV identification information or personal information managed in the management server 1085 in association with the product serial number may be updated and put to use.

[Embodiment A13]

FIG. 424 is a diagram of an overall system structure.

A semi-transmissive mirror transmission plate is attached to a mirror unit in a bathroom. A display, a power antenna, and a RF antenna unit are arranged on a back surface of the mirror transmission plate. The user has a mobile terminal with a RF antenna, and displays some kind of video information on the mobile terminal. A procedure of moving this video to the display of the mirror is described below.

FIG. 425 is a flowchart (first half) of a procedure of moving video to the display of the mirror.

FIG. 425 is a flowchart of the procedure. First, an image output button of the mobile terminal is pressed. Whether or not information or data obtained via a network or a TV channel is being displayed on the terminal is determined. When such information or data is being displayed, a URL or an IP address of a server transmitting the video or data, a stream ID of the video being displayed, stream reproduction time information, and TV channel information are obtained. After this, power transmission/reception is started from the antenna of the mobile terminal. When the antenna of the mobile terminal is brought into proximity of the antenna on the apparatus (device) side, power or a signal is transmitted from the terminal antenna to the apparatus antenna. The mobile terminal then reads attribute information on the apparatus side (video display capability, audio capability, maximum (average) communication speed of Internet inside and outside the house, whether TV channel connection is available, Internet and communication line type), via the apparatus antenna.

In the case where a video source is a TV and the apparatus is connected to a TV antenna, TV channel information and a TV image reproduction display time are transmitted to the apparatus via the antenna. The apparatus displays video of the TV channel on the screen. The image is not horizontally flipped in the case of TV.

Upon receiving a power supply enable flag from the terminal, the apparatus supplies power to the terminal.

Referring back to the previous step, in the case where the apparatus is connected to the Internet, a video rate and resolution are set according to the attribute information of the apparatus, and a server address optimal for the settings, a server ID on a DLNA network, a stream ID in a server, and stream reproduction display time information are transmitted to the apparatus via the RF antenna.

FIG. 426 is a flowchart (second half) of the procedure of moving video to the display of the mirror.

Referring to a flowchart of FIG. 426, the apparatus displays the stream so as to be synchronous with the display time of the video stream being displayed on the terminal, on the basis of the server IP address, the stream ID, and the stream reproduction display time. Once the synchronization has been established, the apparatus switches from the previous display to the next display, that is, the video on the terminal is seamlessly passed to the apparatus.

In the case where simultaneous display of the video on the terminal and the apparatus is prohibited for copyright protection, when the video display on the apparatus starts seamlessly, the video display on the terminal is stopped by means such as transmitting a video stop instruction from the apparatus to the terminal.

Moreover, when the apparatus receives, from the terminal, a "mirror flip identifier" for horizontally flipping the video on the mirror display, the apparatus horizontally flips the video in the next step. Meanwhile, horizontal flip of characters is not performed.

According to the above method, first, the terminal supplies power to the apparatus, and activates the apparatus when the apparatus is not in operation. This benefits power saving. After this, once the apparatus has started operation, then the apparatus supplies power to the terminal. In the case where the terminal receives video data from a server or the like and distributes the video to the apparatus via a network, the terminal needs to transmit the video for a long time via an access point by wireless LAN. When transmitting a large amount of data by wireless LAN, power consumption is high, and there is a possibility that the battery level of the terminal becomes 0. However, this embodiment provides an advantageous effect of preventing battery drain by supplying power from the apparatus to the terminal. Moreover, the mirror shows a reversed image of a human figure. For example, as in the case of a video instruction for toothbrushing, leaning effectiveness decreases because right and left are reversed. However, this embodiment facilitates leaning by horizontal flipping the image.

[Embodiment B]

The following describes Embodiment B (B1 to B7).

A communication device according to Embodiment B of the present invention is described in detail below, with reference to drawings.

For example, the following communication device is described below.

The communication device is a communication device (e.g. the communication device (mobile phone terminal) Y02 in FIG. 440, a mobile phone M1014 in FIG. 427, a mobile device N20 in FIG. 448, see the mobile communication device 98*b* in FIG. 480) that reads terminal device information (e.g. information Y015D in FIG. 440, information Y01U in FIG. 450, see the appliance information 98*n*1 in FIG. 412) from a terminal device (e.g. the terminal device Y01 in FIG. 440, a refrigerator M1013 or a microwave M1012 in FIG. 427, an air conditioner N10J in FIG. 447 (see FIG. 480, the appliance 98*a* in FIG. 480)) by proximity wireless communication (communication by an IC tag or the like, communication within a distance of several centimeters, see the proximity wireless communication 98*c*1 in FIG. 380), and transmits the read terminal device information to a server (the server Y04 in FIG. 440, a registration server M1005 in FIG. 427, see the server 98*c* in FIG. 480) via a general-purpose network (e.g. a network Y02N in FIG. 440, the Internet M1004 in FIG. 427), the communication device including: a terminal device information obtainment unit (an antenna Y021 in FIG. 440, see the appliance information obtainment unit 98*n* in FIG. 480) that obtains the terminal device information (the information Y015D, the information Y01U) from the terminal device by the proximity wireless communication, the terminal device information including at least terminal device identification information (e.g. a product serial number Y015N in FIG. 440, a product serial number Y01Un in FIG. 450) for identifying manufacturing information of the terminal device; a communication device information storage unit (a memory Y024, see a memory 98*i* in FIG. 379) that stores communication device information (information Y025D) including at least communication device identification information (e.g. a product serial number Y025N in FIG. 440) for identifying manufacturing information of the communication device; an information adding unit (the information adding unit Y035, see the transmission unit 98*o* in FIG. 480) that adds the stored communication device information (the information Y025D) to the obtained terminal device information (the information Y015D, the information Y01U), to generate transmission information (information Y036D in FIG. 440, see the transmission information 98*o*1 in FIG. 480) to be transmitted to the server; and a communication unit (the communication unit Y036 in FIG. 440, see the transmission unit 98*o*) that transmits the generated transmission information (the information Y036D) to the server via the general-purpose network, wherein the communication unit specifies the server based on the terminal device information (e.g. an address Y01Ua of the server Y04 (FIG. 450)) obtained from the terminal device, and communicates with the specified server.

According to this structure, even in the case where the device (apparatus, appliance) Y01 is the microwave M1012 or the like, the information (the product serial number Y025N of the communication terminal Y02 of the user) of the user who purchased the device Y01 can be easily transmitted to the server Y04.

Moreover, even in the case where the device Y01 is the microwave M1012 or the like, the device Y01 stores the address Y01Ua or the like for specifying the server Y04 and transmits the stored address Y01Ua or the like. The address Y01Ua or the like is obtained from such a device Y01, and transmitted to the appropriate server Y04 specified by the obtained address Y01Ua or the like. This ensures that the information is transmitted to the appropriate server Y04.

Besides, the input of the address Y01Ua via a keyboard is unnecessary, so that the information can be easily transmitted to the server Y04.

[Embodiment B1]

The following describes Embodiment B1 of the present invention.

FIG. 427 illustrates environments of home networks assumed in Embodiment B1.

A home network is established in each of houses M1001, M1002, and M1003 (see the home 99 in FIGS. 478 and 480). Each of the home networks is connected to a registration server M1005 via the Internet M1004. That is, each of the home networks is formed in the house (the house M1001, M1002, M1003) corresponding to the home network.

If services provided via a home network are limited within a corresponding house, the registration server M1005 may exist in the house. It is also possible that a home network is divided into various places such as a vacation house and an office, and that a plurality of home networks are used in a single house such as a dormitory or a room-sharing house.

It is assumed that, in a house, there are home appliances which are always connected to the Internet M1004 (hereinafter, referred to as "always-connected home appliances") and home appliances which are not always connected to the Internet M1004 (hereinafter, referred to as "non-always-connected home appliances"). The always-connected home appliances, such as TVs M1008 and M1009, a DVD recorder M1010, and the like, are connected to the Internet M1004 via a router M1006 or a wireless Access Point (AP) M1007 (see the access point 99*c* in FIG. 478). The non-always-connected home appliances, such as a digital camera M1011, a microwave M1012, and a refrigerator M1013, are indirectly connected to the Internet M1004 as needed.

For example, there may also be appliances (always-connected home appliances) connected to a device (such as the access point M1007) other than a mobile phone M1014, and appliances (non-always-connected home appliances) not connected to the other device.

In Embodiment B1, a mobile terminal such as the mobile phone M1014 is also a terminal included in the home network.

The devices in Embodiment B1 can perform simple data communication with each other by using a proximity wireless communication device. Each of the devices obtains information of other device using the proximity wireless communication device, and registers the obtained information into the registration server M1005 using a home network device.

FIG. 428 is a hardware diagram of a terminal according to Embodiment B1 of the present invention.

A communication device M1101 according to Embodiment B1 of the present invention is assumed to have two devices for communication.

One communication device is a proximity wireless communication device M1102, which is typically a device of Near Field Communication (NFC) or RF tag (see, for example, a RF-ID reader/writer 98*g* in FIG. 479).

The other communication device is a home network communication device M1103. Examples of the home network communication device M1103 are: a wireless communication device using wireless Local Area Network (LAN) or ZigBee, which is used in connecting home appliances to each other; a wired communication device using Ethernet™ or Power Line Communication (PLC); and a communication device using WiMAX or Third Generation Partnership Project (3GPP), which is used in mobile devices (see, for example, a relay device 98*k* in FIG. 479).

The communication device M1101 also includes a user interface (IF) device M1104. The user IF device is, for example, an input device such as buttons, a display, and an output device using a Light Emitting Diode (LED) or the like. For devices such as TVs and air conditioners, data input/output is generally performed by using a remote controller that is physically separated from the device. For convenience of the description, such a remote controller is also considered as the user IF device M1104 in Embodiment B1 of the present invention.

FIG. 429 is a functional block diagram for explaining a function of a CPU M1105 (FIG. 428).

A device UID obtainment unit M1202 in the communication device M1101 obtains information including device UID (see the product serial number 98*a*1 in FIG. 480) for identifying a registration device M1201 (that is a device to be registered) (see the appliance 98*a* in FIG. 480).

Here, the registration device M1201 transmits a registration command and registration information including device UID of the registration device M1201 to the communication device M1101, by using the proximity wireless communication device M1102 (FIG. 428).

A registration information generation unit M1204 obtains the registration information including the device UID from the device UID obtainment unit M1202 (FIG. 429), and obtains home ID from a home ID management unit M1205. Then, the registration information generation unit M1204 adds the home ID to the registration information obtained from the registration device M1201, to generate registration information.

If position information is to be added to the registration information, the registration information generation unit M1204 obtains the position information from a position information obtainment unit M1206 (see the position information obtainment unit 98*j* in FIG. 480).

Examples of the position information are address information based on a post code inputted to a TV, geographical position information generated by a Global Positioning System (GPS) of a mobile phone, and the like. For instance, the position information may be information (see the position information 98*j*1 in FIG. 480) of such accuracy that at least indicates a position of one home out of positions (positions 99P and 991P) of a plurality of homes (e.g. homes 99 and 991 in FIG. 480). If position information of the registration device M1201 is registered, the registered position information can be used to easily provide services to improve home appliance traceability or the like. A registration information transmitting/receiving unit M1207 (see the transmission unit 98*o* in FIG. 480) performs transmission/reception of the registration information (see the transmission information 98*o*1 in FIG. 480).

The home ID management unit M1205 manages home ID (see FIG. 483) that is different from communication device ID used by the communication device included in the above-described home network.

In conventional home networks, a master device of each communication device manages information such as IDs for the communication device. The management method is different depending on a type of the corresponding communication device. Therefore, it is not possible to manage information on home-by-home basis. Although there is a situation where ID is inputted by a user for each service, this results in quite low usability. In Embodiment B1, introduction of new different ID that is home ID makes it possible to manage pieces of information of devices included in a home network without using a communication device or services.

When the home ID management unit M1205 registers information of a device to the server at the first time, the home ID management unit generates home ID.

The home ID may be generated based on position information or UID of the communication device. It is also possible to generate home ID based on a random number to check whether or not the generated home ID does not overlap with any other ID in the registration server. It is further possible that a user sets the home ID.

When the registration information transmitting/receiving unit M1207 (see the transmission unit 98*o* in FIG. 479) in the communication device M1101 receives registration information from the registration information generation unit M1204, the registration information transmitting/receiving unit M1207 transmits the received registration information to the registration server M1005 (FIGS. 427 and 429, see the server 98*c* in FIG. 480) using the home network communication device M1103 (FIG. 428).

The registration server M1005 compares the received registration information to pieces of information stored in the registration database M1208 to determine whether or not the received registration information can be registered. Then, the registration server M1005 sends a registration response back to the communication device M1101.

In receiving the registration response, the registration information transmitting/receiving unit M1207 notifies the user of a result of the determination by using the user IF device M1104 (FIG. 428).

If the registration server M1005 determines that the received registration information cannot be registered, the registration information transmitting/receiving unit 1207 notifies the determination to the registration information generation unit M1204 (FIG. 429) in order to request change of the registration information. Thereby, it is possible to collectively manage devices in a home network including white goods that do not have user IF devices for communication.

FIG. 430 is a flowchart of registering information of the communication device.

The communication device M1101 receives the registration command and the device UID (M1301), and determines whether or not the communication device M1101 has home ID (M1302).

If the communication device M1101 does not have the home ID (NO at M1302), then the communication device M1101 obtains home ID (the processing is referred to as "home ID obtainment") (M1303).

On the other hand, if the communication device M1101 has the home ID (YES at M1302), the communication device M1101 generates information of the communication device to be registered into the communication device M1101 itself (hereinafter, referred to as "registration information" or "home ID") (M1304).

Next, the communication device M1101 transmits the registration information to the registration server M1005 (M1305).

The communication device M1101 determines whether or not the communication device M1101 receives a response (registration response) to the transmitted registration information from the registration server M1005 (M1306). If the response is not received (NO at M1306), then the communication device M1101 presents a user with a registration failure notification for notifying a failure of the registration processing (M1307) and terminates the registration processing.

On the other hand, if the communication device M1101 receives the response (YES at M1306), then the communication device M1101 presents the user with an inquiry asking whether or not to register the generated information into the communication device M1101 (M1308). If the user replies OK (YES at M1308), then the communication device M1101 completes the registration processing. If the user replies NO (NO at M1308), the communication device M1101 returns to the home ID obtainment. When it is difficult to obtain home ID, the registration processing is terminated as a failure.

FIG. 431 is a flowchart of the home ID obtainment.

The communication device M1101 determines whether or not the communication device M1101 has a function of automatically generating home ID (hereinafter, referred to also as an "automatic generation function") (M1401). If the communication device M1101 has the function (YES at M1401), then the communication device M1101 automatically generates the home ID. On the other hand, if the communication device M1101 does not have the function (NO at M1401), the communication device M1101 asks the user to manually input the home ID.

If there is no method for manually inputting home ID or the user refuses to the manual input (failure at M1402), then the communication device M1101 notifies the user of a failure of the registration processing (M1403) to persuade the user to obtain the home ID by any different method.

When the communication device M1101 automatically generates home ID (YES at M1401), the communication device M1101 selects an appropriate automatic generation function (M1404).

If the communication device M1101 can obtain geographical position information by a GPS or the communication device M1101 is a terminal such as a TV for which an address as position information has been generally registered, the communication device M1101 generates the home ID using the position information (M1405).

If the communication device M1101 is a terminal generally set in a house, the communication device M1101 generates the home ID using a unique identifier of the communication device M1101 (M1406).

Especially if it is difficult to generate effective home ID, the communication device M1101 generates the home ID using a random number (M1407).

After generating the home ID, the communication device M1101 transmits the home ID to the server (M1408). Then, the communication device M1101 receives information regarding the generated home ID from the server, and thereby determines whether or not the home ID can be used (M1409). If it is determined that the home ID cannot be used (NG at M1409), then the communication device M1101 returns to the processing of generating the home ID.

On the other hand, if the home ID can be used (OK at M1409), then the communication device M1101 asks the user whether to not to register the generated home ID into the communication device M1101 itself (M1410). If the user replies OK (YES at M1410), then the communication device M1101 registers the home ID into the communication device M1101 itself (M1411). Otherwise (NO at M1410), the communication device M1101 returns to the processing of generating the home ID.

FIG. 432 is a flowchart of registering information of the registration device.

The registration device M1201 transfers a registration command and information including device UID for identifying the registration device M1201, to the communication device M1101 via the proximity wireless communication device.

If the communication device M1101 does not have home ID, the communication device M1101 generates provisional home ID and transmits the generated provisional home ID to the registration server M1005 via the home network communication device.

The registration server M1005 sends a response with information regarding the provisional home ID to the communication device M1101. On the other hand, if the communication device M1101 has home ID or if the communication device M1101 receives, from the registration server M1005, home ID that is allowed by the registration server M1005 to be used, the communication device M1101 transmits the home ID and the registration information including the device UID to the registration server M1005, thereby completing the registration of information of the registration device M1201.

[Embodiment B2]

In Embodiment B2 of the present invention, a configuration in which the home ID is shared among communication terminals (communication devices) is described.

FIG. 433 is a functional block diagram illustrating a function of sharing home ID between communication devices.

Communication devices M1101S and M1101R (see the mobile communication device 98*b* in FIG. 480) included in a home network share the same home ID using a home network M1601 and the home network communication devices M1103 (M1103S, M1103R). The communication devices M1101S and M1101R may share the home ID using the proximity wireless communication devices M1102.

Note that, as in the above example of "M1103 (M1103S, M1103R)", the term "xxxx" is used as a collective term for "xxxxS" and "xxxxR".

The communication device according to Embodiment B2 (hereinafter, referred to as a "transmitting communication device M1101S") can share the home ID with another communication device (hereinafter, referred to as a "receiving communication device M1101R") in the same house, by transferring a sharing command and home ID to the receiving communication device via the proximity wireless communication devices M1102 (see FIG. 428).

In the transmitting communication device M1101S, a home ID sharing unit M1602S in a home ID management unit M1205S provides the sharing command and the home ID that is held in a home ID storage unit M1209S, to a proximity wireless communication device M1102S.

For example, when the proximity wireless communication device M1102S of the transmitting communication device M1101S is moved into proximity of a proximity wireless communication device M1102R of the receiving communication device M1101R, information is transferred between them. Thereby, the home ID in the transmitting communication device M1101S is stored into the proximity wireless communication device M1102R of the receiving communication device M1101R.

If a home ID storage unit M1209R in the receiving communication device M1101R does not hold any home ID, a home ID sharing unit M1602R in the receiving communication device M1101R stores the received home ID into the receiving communication device M1101R itself.

Thereby, it is possible to quite easily share the home ID between the communication devices.

On the other hand, if the home ID storage unit M1209R already holds home ID, the receiving communication device M1101R transmits both the held home ID and the received home ID to the registration server M1005. In receiving both home IDs, the registration server M1005 manages both home IDs virtually as a single home ID.

The registration server M1005 may notify both communication devices of one of the home IDs to unify them. Even in this case, the registration server M1005 manages both home IDs virtually as a single home ID since there are non-always-connected devices in the home network.

It is possible that ID of a non-always-connected device is updated every time of being connected to the home network and the virtual management by the registration server M1005 ends when updating of all of the registration devices (namely, devices to be registered which are included in the home network) are completed. Thereby, it is possible to unify originally plural home networks into a single network.

The home ID sharing can be performed by using the home network.

When a communication device is to be connected to the home network M1601 and a home network connection detection unit M1603S (FIG. 433) of the communication device detects that the communication device does not hold home ID, the communication device broadcasts a request for home ID sharing to terminals connected to the home network M1601.

Terminals holding home ID among the terminals connected to the home network M1601 transmit the home ID to the communication device.

Thereby, the home ID sharing is completed prior to start of communication.

Here, if a master terminal to respond to requests for home ID sharing is previously selected from among terminals holding the home ID, it is possible to prevent that a device requesting home ID sharing receives responses from a plurality of terminals thereby overburdening the home network. If there is no response, the communication device terminal requesting home ID sharing may obtain home ID by itself.

FIG. 434 is a flowchart of processing performed by the receiving communication device M1101R when home ID is shared using the proximity wireless communication device M1102.

When the receiving communication device M1101R receives a sharing command and home ID (M1701), the receiving communication device M1101R determines whether or not the receiving communication device M1101R holds home ID (M1702).

If the receiving communication device M1101R does not hold home ID (NO at M1702), then the receiving communication device M1101R registers the received home ID, as home ID, into the receiving communication device M1101R itself (M1703).

On the other hand, if the receiving communication device M1101R holds home ID (YES at M1702), the receiving communication device M1101R compares the held home ID to the received home ID.

If the held home ID is identical to the received home ID (identical at M1704), the receiving communication device M1101R terminates the processing without any further processes.

On the other hand, if the held home ID is not identical to the received home ID (different at M1704), the receiving communication device M1101R selects home ID (M1705).

The selection of home ID may be performed by the receiving communication device M1101R or the registration server.

In the situation where the receiving communication device M1101R asks the registration server to perform the selection, the receiving communication device M1101R transmits the held home ID and the received home ID to the registration server as sharing information (M1706). Thereby, the receiving communication device M1101R receives, from the registration server, a sharing response including home ID selected by the registration server (M1707). Then, the communication device M1101R inquiries the user whether or not to share (register) the selected ID into the communication device M1101R (M1708). If the user replies OK (YES at M1708), the registration processing is completed. It the user replies NO (NO at M1708), the received ID receiving communication device M1101R returns to the processing for selecting home ID.

In the case where the receiving communication device M1101R itself selects the held home ID, the receiving communication device M1101R transmits the held home ID as home ID and the received home ID as sharing home ID to the registration server (M1709).

The registration server notifies updating of the home ID to other communication devices already sharing home ID.

In the situation where the receiving communication device M1101R selects the received home ID, then the receiving communication device M1101R updates the held home ID by the received home ID (M1710). In addition, the receiving communication device M1101R transmits the previously held home ID as sharing home ID and the received home ID as home ID to the registration server (M1711). The registration server notifies updating of the home ID to other communication devices already sharing home ID.

FIG. 435 is a flowchart of processing performed by the transmitting communication device M1101S when home ID is shared using the proximity wireless communication device M1102.

After transmitting a sharing command and home ID to the registration server, the transmitting communication device M1101S determines whether or not a response to the home ID sharing is received from the registration server (M1752). If there is no response (NO at M1752), the transmitting communication device M1101S terminates the processing. On the other hand, if the response including a notification of updating home ID is received (YES at M1752), the transmitting communication device M1101S updates the home ID by the notified home ID (M1753) and completes the processing.

FIG. 436 is a sequence diagram of the situation where the registration server selects home ID.

The transmitting communication device M1101S transmits home ID_A to the receiving communication device M1101R by using the proximity wireless communication device. The receiving communication device M1101R transmits home ID_B that is held in the receiving communication device M1101R itself and the received home ID_A to the registration server M1005. The registration server selects the home ID_B from the received home IDs, and notifies the home ID_B to a communication device holding the home ID_A and the receiving communication device M1101R to cause the devices to register the home ID_B.

FIG. 437 is a flowchart of processing performed by the transmitting communication device M1101S when home ID is shared using the home network communication device M1103.

The transmitting communication device M1101S detects connection to the home network (M1801), and broadcasts a request for home ID sharing to terminals in the home network (M1802). If a response to the request for home ID sharing is received (YES at M1803), the transmitting communication device M1101S registers home ID received with the response into the transmitting communication device M1101S itself (M1804). On the other hand, if the response is not received (NO at M1803), the transmitting communication device M1101S performs the home ID obtainment (M1303).

FIG. 438 is a flowchart of processing performed by the receiving communication device M1101R when home ID is shared using the home network communication device M1103.

After receiving the request for home ID sharing (M1851), the receiving communication device M1101R determines whether or not the receiving communication device M1101R itself is a master terminal selected in the home network (M1852). If the receiving communication device M1101R is the master terminal (YES at M1852), then the receiving communication device M1101R transmits home ID held in the receiving communication device M1101R itself in response to the request (M1853). On the other hand, if the receiving communication device M1101R is not the master terminal (NO at M1852), then the receiving communication device M1101R does not perform any processes. Here, if a master terminal is not selected from terminals holding home ID, the receiving communication device M1101R responds to all requests for home ID sharing from any terminals without the determination regarding the master terminal.

FIG. 439 is a sequence diagram of the situation where the home ID is shared using the home network communication device M1103.

When a communication device detects connection to a home network, the communication device broadcasts a request for home ID sharing to terminals in the home network. Only a communication device M1854 selected as the master terminal from among communication devices receiving the request responds to the request. The communication device receiving the response registers home ID received with the response, into the communication device itself.

[Embodiment B3]

A communication device according to Embodiment B3 of the present invention is described in detail with reference to the drawings. The communication device according to Embodiment B3 of the present invention reads terminal device information regarding a terminal device from the terminal device by using a NFC function, and transfers the terminal device information to a server via a general-purpose network.

FIG. 440 illustrates a system according to Embodiment B3. The system according to Embodiment B3 includes the terminal device Y01, the communication device Y02, and the server Y04.

The subject of Embodiment B3 is the communication device Y02.

The terminal device Y01 (see the appliance 98*a* in FIG. 480) is a device having a NFC function (RF-ID unit, IC tag, or NFC tag emulation). The terminal device Y01 is, for example, an electronic terminal device such as a refrigerator, a microwave, a washing machine, a TV, or a recording device (see, for example, FIG. 427). The terminal device Y01 has an internal memory for holding, as terminal device information (see the information Y015D), a product serial number (see the product serial number Y015N) that is ID for identifying the terminal device Y01, use history information of the terminal device Y01, error information, and the like.

The communication device Y02 (see the mobile communication device 98*b* in FIG. 480) has a NFC function for communicating with the NFC function of the terminal device Y01 by proximity wireless communication. The communication device Y02 includes a reader/writer function of reading the terminal device information from the terminal device Y01. The communication device Y02 is, for example, a portable device such as a mobile phone or a remote controller terminal of a TV.

The server Y04 (see the server 98*c* in FIG. 480) is a server connected to the communication device Y02 in order to communicate with the communication device Y02, via a general-purpose network such as the Internet (see the Internet M1004 in FIG. 427). The server Y04 includes a database (DB) for accumulating the terminal device information that is read from the terminal device Y01 to the communication device Y02.

The terminal device Y01 includes a CPU Y011, a failure sensor unit Y012, a use history logging unit Y013, a memory Y014, a modulation unit Y017, and an antenna Y018.

The CPU Y011 is a unit that controls a system of the terminal device Y01. The CPU Y011 controls the failure sensor unit Y012, the use history logging unit Y013, the memory Y014, and the modulation unit Y017 which are units included in the terminal device.

The failure sensor unit Y012 is a unit that detects a location and detail of a failure occurred in each unit included in the terminal device Y01. A piece of failure information detected by the failure sensor unit Y012 is accumulated in a RAM in the memory Y014. The detected failure information is represented by an error code that is uniquely defined depending on a location and condition of the failure.

The use history logging unit Y013 is a unit that performs logging for each piece of use history information every time the terminal device Y01 is operated by the user. The use history information applied with logging is accumulated into the RAM Y016 in the memory Y014. In general, when use history information is used to examine how a failure has occurred, several pieces of use history information up to occurrence of the failure have high priorities of being examined. Therefore, it is desirable that the use history logging unit Y013 according to Embodiment B3 uses the RAM Y016 as First In First Out (FIFO) to chronologically accumulate new pieces of use history information into the RAM Y016. Moreover, when use history information is used to examine how a failure has occurred, it is desirable that several pieces of use history information up to a timing detected by the failure sensor unit Y012 are stored as priorities into the RAM. Therefore, if when five minor failures are detected in using the terminal device Y01, several pieces of operation (use) history information up to the five failures are stored as priorities.

The memory Y014 includes a ROM Y015 and the RAM Y016.

The ROM Y015 previously stores at least the product serial number Y015N for uniquely identifying the terminal device Y01 when the terminal device Y01 has been shipped. The user of the terminal device Y01 cannot update the information previously held in the ROM Y05.

The product serial number is desirably information by which a manufacturer, a manufacturing lot number, and a manufacturing date of the terminal device Y01 can be determined.

It is also desirable that the ROM Y015 is embedded in a semiconductor chip of the CPU Y011. This structure prevents information during memory access to be easily inspected. Therefore, secret key information for authentication and encrypted communication in proximity wireless communication with the communication device can be recorded on the ROM Y015 when shipping.

The RAM Y016 is a rewritable memory in which the failure information detected by the failure sensor unit Y012 and the use history information applied with logging of the use history logging unit Y013 are accumulated.

The modulation unit Y017 is a unit that modulates communication data for proximity wireless communication with the communication device Y02. The modulation method varies depending on employed NFC standard. For example, Amplitude Shift Keying (ASK), Frequency Shift Keying (FSK), Phase Shift Keying (PSK), and the like are used.

The antenna Y018 generates electromagnetic induction from radio waves emitted from an antenna of the communication device Y02. The antenna Y018 performs at least processing of providing power to the modulation unit Y017 and the memory Y014 to be operated. In addition, the antenna Y018 overlaps reflected waves of the radio waves emitted from the communication device Y02 with signals modulated by the modulation unit Y017 to transmit the terminal device information that is stored in the memory Y014 to the communication device Y02.

As described above, the terminal device according to Embodiment B3 detects failures occurred in each unit included in the terminal device. Then, the terminal device performs logging for use histories to accumulate the use histories into the memory. Then, if the terminal device is moved into proximity of the communication device Y02 to be capable of performing proximity wireless communication with the communication device Y02, the terminal device can transmit the terminal device information (the information Y015D) stored in the memory into the communication device Y02.

Next, the communication device Y02 according to Embodiment B3 is described. It should be noted that the subject of Embodiment B3 is the communication device Y02.

The communication device Y02 includes an antenna Y021, a CPU Y022, a demodulation unit Y023, a memory Y024, a position information determination unit Y027 (see the position information obtainment unit 98*j* in FIG. 480), a GPS antenna Y031, a communication memory Y032, an information adding unit Y035, and a communication unit Y036.

The antenna Y021 performs polling for calling any terminal devices in order to search for a terminal device communicable with the communication device Y02 by proximity wireless communication.

In receiving a response to the polling, the antenna Y021 establishes proximity wireless communication with the responding terminal device Y01 to receive modulated terminal device information (the information Y015D) from the terminal device Y01, and provides the modulated terminal device information to the demodulation unit Y023.

In general, the polling processing is always necessary even if there is no terminal device communicable with the communication device Y02 by proximity wireless communication. This consumes power. Therefore, the communication device Y02 is provided with a switch (not shown) for controlling a timing of start of polling, so that polling processing is performed when the switch is turned ON. This structure can significantly shorten a time period of the polling. As a result, the power consumption amount can be considerably reduced. This is especially efficient when the communication device Y02 operates by a limited power source such as a battery.

The CPU Y022 is a unit that controls a system of the communication device Y02. The CPU Y022 controls operations of each unit included in the communication device Y02.

The modulation unit Y023 is a unit that demodulates data modulated by the modulation unit Y017 of the terminal device Y01. The demodulated terminal device information is temporarily stored into the memory Y024.

The memory Y024 includes a ROM Y025 and a RAM Y026.

The ROM Y025 is a memory that cannot be rewritten by the outside. The ROM Y025 previously holds a product serial number (the product serial number Y025N) for uniquely identifying the communication device Y02 when the communication device Y02 has been shipped.

The product serial number is desirably information by which a manufacturer, a manufacturing lot number, and a manufacturing date of the communication device Y02 can be determined.

It is also desirable that the ROM Y025 is embedded in a semiconductor chip of the CPU Y022. This structure prevents information during memory access from being easily inspected. Therefore, secret key information for authentication and encrypted communication in proximity wireless communication with the terminal device Y01 can be recorded on the ROM Y025 when shipping.

The RAM Y026 holds the terminal device information of the terminal device Y01 which is received by the antenna Y021 and demodulated by the demodulation unit Y023. As described earlier, the terminal device information includes the product serial number for uniquely identifying the terminal device Y01, the use history information of the terminal device Y01, and failure codes.

The position information determination unit Y027 is a group of sensors for determining a location of the communication device Y02. The position information determination unit Y027 includes a latitude/longitude positioning unit (GPS) Y028, an altitude positioning unit Y029, and a position correction unit Y030.

The position information determination unit Y027 does not need to always determine a location of the communication device Y02 (location information) if the location information is generated at a timing where the communication device Y02 becomes communicable with the terminal device Y01 using the antenna Y021. As a result, power consumption of the communication device Y02 can be reduced.

The latitude/longitude positioning unit Y028 is a general Global Positioning System (GPS) that receives radio waves from satellites to perform 3-dimensional positioning of the earth (see a GPS device 98*j*1*x* in FIG. 481).

The altitude positioning unit Y029 is a general altimeter. The altitude positioning unit Y029 may be any various altimeters, such as an altimeter receiving radio waves to extract an altitude, an altimeter detecting an air pressure to measure an altitude, and the like. The altitude positioning unit Y029 is provide to the communication device Y02 so that an altitude can be detected even in a building where GPS cannot receive radio waves.

The position correction unit Y030 is a unit that corrects a value measured by the GPS to generate more accurate position information. In general, when radio waves from satellites cannot be received in a room or the like, the GPS cannot generate correct position information. Therefore, the position correction unit Y030 includes an electronic compass and a 6-axis acceleration sensor. The electronic compass is used to detect a direction in which the communication device Y02 moves and the acceleration sensor is used to detect a speed of the movement. Thereby, it is possible to correct position information generated by the GPS in a location where the GPS is difficult (see the acceleration sensor **98*j*2*x* in FIG. 488**).

Regarding the information adding unit Y035, when the terminal device information that has been provided from the terminal device Y01 and stored into the memory Y024 is to be transmitted to the server Y04, the information adding unit Y035 adds (a) the product serial number of the communication device Y02 that is stored in the ROM Y025 in the memory Y024 and (b) the position information (information Y027) measured by the position information determination unit Y027, to the terminal device information.

This enables the server Y04 to determine which communication device transmits the terminal device information, where the transmitting terminal device is located, for example, and then manage the results of the determination.

For example, if a manufacturer of the terminal device finds that the terminal device has a possibility of causing serious accidents (troubles), the information in the database of the server Y04 allows the manufacturer to determine where the terminal device is. Thereby, the possibility of causing serious accidents can be reduced. As a result, it is possible to increase sense of safety and security of the user using the terminal device.

Furthermore, when the communication device Y02 has a display function as mobile phone terminals have, the above-described terminal device information generated by the information adding unit Y035 makes it possible to determine with which communication device the terminal device having a possibility of accidents can perform proximity wireless communication, and thereby display a notification of the possibility of accidents (troubles) in the terminal device on the communication device Y02. Thereby, even if such a terminal device generally does not have any display function and is not connected to a general-purpose network, it is possible to transmit a notification of the accident possibility of the terminal device to the communication device Y02 in order to warn the user using the terminal device. As a result, it is also possible to provide a terminal device that can increase sense of safety and security of the user using the terminal device.

The communication unit Y036 is a unit that communicates with the server Y04 via the Internet by using general LAN, wireless LAN, or mobile phone network. Thereby, the communication unit Y036 transmits, to the server Y04, the terminal device information added with the product serial number and the position information of the communication device Y02 as the communication device information. Here, the added terminal device information is further added with a MAC address and an IP address to be transmitted to the server Y04.

The server Y04 is connected to the communication device Y02 via a general-purpose network such as the Internet. The server Y04 includes a device management database (DB) for managing the terminal device information.

The device management DB Y041 stores the terminal device information (information **Y052*d*) in association with the communication device information (see information Y051 in FIG. 442). In the device management DB Y041 according to Embodiment B3, the communication device information is managed as parent device information, and the terminal device information is managed as child device information in association with the parent device information. The child device information is added with the position information generated by the communication device in order to manage further information indicating where the terminal device is (the position of the terminal device Y01**).

As described above, in the system according to Embodiment B3, the terminal device information (the information Y015D) is read from the terminal device (the terminal device Y01) by the communication device (the communication device Y02) using proximity wireless communication. The communication device is touched to the terminal device to communicate with the terminal device to obtain the terminal device information. The communication device adds the product serial number Y025N and position information (information Y027D) of the communication device at the time when the proximity wireless communication is enabled, to the obtained terminal device information, and transmits the generated information to the server. Thereby, the server can manage the communication device information as parent device information in association with the terminal device information as child device information (see FIG. 442).

Therefore, if a manufacturer of the terminal device finds that the terminal device would cause serious accidents, the manufacture can easily recall the terminal device (the terminal device Y01) or display a notification of a possibility of the serious accident on a display unit of the communication device (the communication device Y02). As a result, it is possible to achieve traceability of the products (the terminal device Y01) and to provide the users of the products with safety and security.

FIG. 441 is a sequence diagram of processing performed by the units included in the system described with reference to FIG. 440.

First, the communication device Y02 performs polling to the terminal device Y01 to establish proximity wireless communication (SY01).

In terms of power consumption amount of the communication device, it is desirable as described earlier that a switch operated by a user is provided so that the polling is performed while the switch is being pressed or the polling starts when the switch is pressed (SY01).

Next, the terminal device Y01 sends a response to the polling to the communication device Y02 in order to establish proximity wireless communication with the communication device Y02 (SY02).

At this timing, the position information determination unit Y027 of the communication device Y02 generates position information of a current position to be used as position information of the terminal device Y01.

The generation of the position information is not limited to be performed only in completion of the polling. The position information may be generated any time while the proximity wireless communication is established after the response to the polling. It is important to determine the position of the terminal device Y01 at a high accuracy, by generating position information of the position where proximity wireless communication, which can be performed when a distance between communicating devices is only several centimeters, is established.

After the establishment of the proximity wireless communication at SY02, mutual authentication between the terminal device Y01 and the communication device Y02 is performed using general public key cryptography, and also key sharing is temporarily performed to share cryptography keys generated by the terminal device Y01 and the communication device Y02 between the devices (SY03). After that, while the proximity wireless communication is established, data on the communication path is encrypted using the cryptography keys to communicate between the devices. As a result, tapping of the data can be prevented.

After completing the key sharing, the terminal device Y01 transmits the terminal device information recorded on the memory Y014 of the terminal device Y01, to the communication device Y02 (SY04).

When the communication device Y02 receives the terminal device information from the terminal device Y01, the communication device Y02 stores the received terminal device information into the memory Y024 of the communication device Y02 (SY05).

When the communication device Y02 completes receiving of the terminal device information from the terminal device Y01, the communication device Y02 issues a connection request to the server Y04 (SY06).

The server Y04 responds to the connection request of SY06 to establish communication with the communication device Y02 (SY07).

After establishing communication between the communication device Y02 and the server Y04, the communication device Y02 adds the communication device information of the communication device Y02 to the terminal device information of the terminal device Y01 to be transmitted to the server Y04 (SY08).

Here, the communication device information includes, for example, a product serial number of the communication device Y02, position information of the communication device Y02 when proximity wireless communication with the terminal device Y01 is established, an e-mail address of the user registered in the communication device Y02 (if any), a connection account to the server Y04 registered in the communication device Y02 (if any), and the like.

The communication device Y02 may obtain, from the terminal device Y01, information (see, for example, the address Y01Ua in FIG. 450) for specifying the server Y04 from among a plurality of computers (servers), such as an address of the server Y04, and communicate with the server Y04 specified by the obtained information.

After adding the communication device information to the terminal device information at SY08, then the communication device Y02 transmits the terminal device information added with the communication device information (see the information Y036D in FIG. 440) to the server Y04 (SY09).

The server Y04 registers the terminal device information added with the communication device information received from the communication device Y02, into the device management DB Y041. Thereby, the processing is completed.

Thereby, the server Y04 can manage pieces of information regarding devices for each house, by managing information of each terminal device Y01, which establishes proximity wireless communication with the communication device Y02 touching the terminal device Y01, in association with identification information (product serial number or the like) of the communication device Y02.

In addition, for the position information registered as information of a position at which the terminal device is equipped, position information indicating a position where proximity wireless communication is established between the communication device Y02 and the terminal device Y01 is used. Since the proximity wireless communication according to Embodiment B3 is performed at common High Frequency (HF) of 13.56 MHz, the communication is possible when a distance between communicating devices is within several centimeters. Therefore, if the position information detected in establishing proximity wireless communication is set to be position information of the terminal device, a maximum error is several centimeters which results in assuring an enough accuracy to achieve traceability of the products.

FIG. 442 is a schematic diagram illustrating a group of pieces of information of terminal devices managed in association with information of the communication device Y01 in the device management DB Y041 of the server Y04.

For example, a data structure of the device management DB Y041 may correspond to the structure illustrated in FIG. 129. See also FIG. 483 according to need.

When the user intends to perform user registration or the like for a terminal device using the communication device Y02 in purchasing the terminal device, the following processing is performed. The user equips the terminal device and touches the terminal device by the communication device Y02. Thereby, terminal device information of the terminal information is provided to the communication device Y02 using proximity wireless communication. The communication device Y02 adds the communication device information of the communication device Y02 to the terminal device information in order to be transmitted to the server Y04.

In receiving the terminal device information added with the communication device information, the server Y04 manages the terminal device information as child device information and the communication device information as parent device information in association with each other in the device management DB.

For example, in the device management DB, terminal device information of a terminal device 1 (for example, a microwave Y052), terminal device information of a terminal device 2 (for example, a washing machine Y053), and terminal device information of a terminal device 3 (for example, a TV Y054), all of which are touched by a communication device Y051, are managed in association with a product serial number of the communication device Y051. Each of the terminal device information includes whereabout information (longitude, latitude, altitude, and the like) and use status information (use histories, error codes, use time periods, and the like).

Thereby, the server Y04 can manage pieces of information of devices for each house, because the communication device Y051 touches these terminal devices. As a result, traceability of the terminal devices can be achieved.

Furthermore, the communication device generates position information when proximity wireless communication with the terminal device is established and uses the generated position information as position information of the terminal device. Therefore, it is possible to register a position of the terminal device with an error of several centimeters which is a distance capable for proximity wireless communication between devices. Since the GPS in the communication device is used to generate the position information of the terminal device, each terminal device does not have a GPS, thereby reducing a cost.

FIG. 443 is a schematic diagram illustrating display screens of the display unit of the communication device Y02 when the communication device Y02 touches the terminal device Y01.

Here, the communication device Y02 may include a display unit Y02*x* in FIG. 440, where each display screen Y02*x*S (FIG. 443) is displayed by the display unit Y02*x*.

First, the description is given for the situation where the communication device Y02 touches the terminal device Y01 to register information of the terminal device Y01 into the server Y04.

When the user operates the communication device Y02 to start up a reader/writer application of the communication device Y02, the communication device Y02 displays, on a display screen, a message persuading the user to touch the terminal device Y01 for proximity wireless communication (Y060).

When the communication device Y02 touches the terminal device Y01, proximity wireless communication is established between the devices. The communication device Y02 reads terminal device information of the terminal device Y01 from the terminal device Y01, generates position information of a current position, and provides the pieces of information to the memory in which the pieces of information are temporarily stored. Then, the communication device Y02 establishes communication with the server Y04 and transmits the terminal device information added with communication device information of the communication device Y02 to the server Y04.

The server Y04 determines whether or not the terminal device information has already been registered in the device management DB. If it is determined that the terminal device information has not yet been registered in the device management DB, then the server Y04 causes the communication device Y02 to display, on the display unit of the communication device Y02, a message asking the user whether or not to register information of the terminal device Y01 (Y061).

Next, when the user selects to register the information of the terminal device Y01, the server Y04 causes the communication device Y02 to display a message asking the user whether or not to register position information of the terminal device. When the user selects to register the position information, the server Y04 registers the position information associated with the terminal device information transmitted from the communication device Y02 to the server Y04, into the device management DB of the server Y04 as position information of the terminal device Y01 (Y062).

Next, the description is given for the situation where the position information of the terminal device Y01 is different from the position information registered in the device management DB of the server Y04.

When the user operates the communication device Y02 to start up a reader/writer application of the communication device Y02, the communication device Y02 displays, on the display screen, a message persuading the user to touch the terminal device Y01 by the communication device Y02 to perform proximity wireless communication (Y063).

When the communication device Y02 touches the terminal device Y01, proximity wireless communication is established between the devices. The communication device Y02 reads terminal device information of the terminal device Y01 from the terminal device Y01, generates position information, and transmits the terminal device information added with communication device information of the communication device Y02 to the server Y04.

The server Y04 compares (a) a product serial number of the terminal device which is included in the received terminal device information to (b) a product serial number registered in the device management DB, in order to examine whether or not information of the touched terminal device is already registered in the server Y04. In addition, the server Y04 extracts the position information from the received communication device information, and examines whether or not the extracted position information is identical to the position information registered in the device management DB. Since the position information has an error, of course, the determination is made to compare the position information to a threshold value that has the order of several centimeters (in other words, the threshold value is a value corresponding to a distance between devices capable for proximity wireless communication). If it is determined that the extracted position information is different from the registered position information, the server Y04 causes the communication device Y02 to display, on the display unit, a message notifying the user of the result of the determination (Y064).

Then, the communication device Y02 displays, on the display unit, a message asking the user whether or not to update the position information of the terminal device Y01 to information of a current position of the terminal device Y01 (Y065).

If the user selects to update the position information, the communication device Y02 registers the position information generated by touching the terminal device Y01 by the communication device Y02, into the device management DB of the server Y04 as new position information of the terminal device Y01.

Therefore, according to Embodiment B3, even if the position information that has been registered is changed because the terminal device Y01 is moved and equipped at a different location, it is possible to update the position information to new position information that is generated by touching the terminal device Y01 by the communication device Y02. Thereby, an accuracy of traceability of the terminal device Y01 can be improved.

[Embodiment B4]

It is comparatively preferable to understand, for example, Embodiment B3 first among Embodiments A (A1 to A13) and B (B1 to B7), as noted earlier.

In Embodiment B4, FIGS. 444 to 461 are referenced as noted earlier.

FIG. 444 is a functional block diagram of the RF-ID unit N10 according to Embodiment B4 of the present invention.

Referring to FIG. 444, the RF-ID unit N10 (see, for example, a RF-ID tag 98*f* in FIG. 479) includes an antenna N11, a power supply unit N12, a memory N13, a reproducing unit N14, and a data transfer unit N15. The antenna N11 is used for proximity wireless communication. The power supply unit N12 is supplied with power via the antenna N11. The memory N13 is a nonvolatile memory in which pieces of individual identification information are stored. The reproducing unit N14 reproduces data registered in the memory N13. The data transfer unit N15 transmits the data registered in the memory N13 into the outside via the antenna N11.

The memory N13 stores UID N13A, a part number N13B, server specific information N13, and an operation program N13D. The UID N13A is used to identify a product having the RF-ID unit N10. The part number N13B is used to identify a part number of the product having the RF-ID unit N10. The server specific information N13C is used to specify the registration server N40. The operation program N13D is to be executed by the mobile device N20.

FIG. 445 is a functional block diagram of the mobile device N20 according to Embodiment B4 of the present invention.

Referring to FIG. 445, the mobile device N20 (see the mobile communication device 98*b* in FIG. 480) includes a RF-ID reader/writer N21, a RF-ID storage unit N22, a program execution unit N23, a data processing unit N24, a memory unit N25, a display unit N26, a communication I/F unit N27, a transmission unit N28, a receiving unit N29, a communication unit N30, a GPS N31 (see the GPS device 98*j*1*x* in FIG. 481), a 6-axis sensor N32 (see the acceleration sensor 98*j*2*x* in FIG. 488), a position information storage unit N33, and a CPU N34. The RF-ID reader/writer N21 receives data from the RF-ID unit N10. The RF-ID storage unit N22 holds the data provided from the RF-ID reader/writer N21. The program execution unit N23 executes a program included in the data. The data processing unit N24 performs data processing for image data included in the data. The memory unit N25 holds the image data processed by the data processing unit N24. The display unit N26 displays the image temporarily stored in the memory unit N25. The communication I/F unit N27 connects the mobile device N20 to other device via a general-purpose network. The transmission unit N28 transmits data to the outside via the communication I/F unit N27. The receiving unit N29 receives data from the outside via the communication I/F unit N27. The communication unit N30 communicates with other device via a general-purpose network by using the communication I/F unit N27. The GPS N31 measures a position of the mobile device N20 to generate absolute position information of the mobile device N20. The 6-axis sensor N32 measures a position of the mobile device N20 to generate relative position information of the mobile device N20. The position information storage unit N33 holds results of the measurement of the GPS N31 and the 6-axis sensor N32. The CPU N 34 analyzes the position information stored in the position information storage unit N33.

FIG. 446 is a functional block diagram of the registration server N40 according to Embodiment B4 of the present invention.

Referring to FIG. 446, the registration server N40 (see, for example, the server 98*c* in FIG. 480) includes a communication I/F unit N41, a transmission unit N42, a receiving unit N43, a communication unit N44, a product information management unit N45, an image data storage unit N46, a program storage unit N47, a position information generation unit N48, and a product control unit N49. The communication I/F unit N41 connects the registration server N40 to other device via a general-purpose network. The transmission unit N42 transmits data to the outside via the communication I/F unit N41. The receiving unit N43 receives data from the outside via the communication I/F unit N41. The communication unit N44 communicates with other device via a general-purpose network by using the communication I/F unit N41. The product information management unit N45 manages product information received from the communication I/F unit N41. The image data storage unit N46 holds image data to be transmitted to the mobile device N20. The program storage unit N47 holds a program to be transmitted to the mobile device N20. The position information generation unit N48 generates a map indicating position relationships among the products having the RF-ID unit N10, by combining the pieces of product information stored in the product information management unit N45. The product control unit N49 controls the products having the RF-ID units N10 by using the pieces of product information stored in the product information management unit N45 and information of a current position of the mobile device N20.

Embodiment B4 differs from the other embodiments in that the products in the house are controlled based on a product map generated from (a) the position information of the mobile device N20 and (b) pieces of position information of the products having the RF-ID units N10.

FIG. 447 is a diagram illustrating an example of an arrangement of the networked products according to Embodiment B4 of the present invention.

Referring to the arrangement diagram of FIG. 447, in the house, there are: a TV N10A, a BD recorder N10B, an air conditioner N10C, and a FF heater N10K in a living room on the first floor; an air conditioner N10D and a fire alarm N10E in an European-style room on the first floor; an air conditioner N10F and a fire alarm N10G in a Japanese-style room on the first floor; a TV N10I and an air conditioner N10J on the second floor; and a solar panel N10H on a roof (see also FIG. 478 and the like).

FIG. 448 is a diagram illustrating an example of the system according to Embodiment B4 of the present invention.

FIG. 448 is a configuration of the system formed by the home appliances in the arrangement of FIG. 447.

This system includes: products from the TV N10A to the FF heater N10K; the mobile device N20 illustrated in FIG. 445; the registration server N40 illustrated in FIG. 446; a home network N100; and an external network N101. Each of the products N10A to N10K has the RF-ID unit N10 illustrated in FIG. 444 and a communication I/F unit N18 to communicate with other products and devices via a general-purpose network. The home network N100 connects the products N10A to N10K and the mobile device N20 to one another. The external network N101 connects the home network N100 to the registration server N40.

The following describes an example of a method of registering information regarding a product having the RF-ID unit N10 into the registration server N40 with reference to FIGS. 449 to 454.

FIG. 449 is a sequence diagram for registering information of the TV N10A into the registration server N40.

First, when a user moves the mobile device N20 to bring the RF-ID reader/writer N21 of the mobile device N20 to proximity of an antenna N11 of the TV N10A (see the touching movement 98*b*1 in FIG. 480), the RF-ID reader/writer N21 supplies power to a power supply unit N12 of the TV N10A via the antenna N11 to provide power to each unit in the RF-ID unit N10 ((1) in FIG. 449).

The reproducing unit N14 (FIG. 444) in the RF-ID unit N10 generates product information. The product information includes the UID N13A, the part number ID N13B, the server specific information N13C, and the operation program N13D stored in the memory N13.

FIG. 450 is a table illustrating an example of a structure of product information and server registration information according to Embodiment B4 of the present invention.

(a) in FIG. 450 illustrates an example of a structure of product information.

The product information illustrated in (a) in FIG. 450 includes: part number ID that is a part number of the TV N10A (including color information); UID that is a product serial number of the TV N10A; server specific information including an address, a login ID, and a password regarding the registration server N40; and an operation program to be executed by the program execution unit N23 in the mobile device N20.

The data transfer unit N15 in the RF-ID unit N10 modulates the product information (signal) and transmits the modulated product information to the RF-ID reader/writer N21 of the mobile device N20 via the antenna N11 ((2) in FIG. 449).

The RF-ID reader/writer N21 in the mobile device N20 receives the product information and stores the received product information into the RF-ID storage unit N22.

The program execution unit N23 (see, for example, FIG. 445) executes the operation program included in the product information stored in the RF-ID storage unit N22.

Here, the program execution unit N23 executes the operation program to "generate server registration information to be transmitted to the address of the registration server N40 which is designated in the product information".

(b) in FIG. 450 is a table illustrating an example of a structure of server registration information.

The server registration information illustrated in (b) in FIG. 450 includes: part number ID that is a part number of the TV N10A (including color information); UID that is a product serial number of the TV N10A; server specific information including a login ID and a password regarding the registration server N40; and position information of the mobile device N20.

Next, the position information (see the position information **98*j*1*x* in FIG. 480) of the mobile device N20** is explained.

The GPS N31 in the mobile device N20 constantly operates while the mobile device N20 is active. Detected results of the GPS N31 are stored in the position information storage unit N33.

The 6-axis sensor N32 operates when the mobile device N20 is outside an area in which the GPS N31 can perform positioning. The 6-axis sensor N32 stores detected results into the position information storage unit N33.

The program execution unit N23 generates position information to be included in the server registration information, from the results detected by the GPS N31 and the 6-axis sensor N32 which are stored in the position information storage unit N33.

From the generated position information and information stored in the RF-ID storage unit N22, the program execution unit N23 generates the server registration information as illustrated in (b) in FIG. 450.

Next, the communication unit N30 designates an address of the registration server N40 which is recorded on the RF-ID storage unit N22, to be a destination address of the server registration information.

The transmission unit N28 transmits the generated server registration information via the communication I/F unit N27 ((3) in FIG. 449).

The receiving unit N43 of the registration server N40 receives the server registration information via the communication I/F unit N41.

The communication unit N44 confirms the login ID and the password in the server registration information.

If the login ID and the password are correct, the registration server N40 stores, into the product information management unit N45, the part number ID, the UID, and the position information included in the server registration information.

FIG. 451 is a table illustrating an example of a structure of product information stored in a product information management unit N45 according to Embodiment B4 of the present invention.

(a) in FIG. 451 is a table illustrating an example of a structure of product information regarding the TV N10A which is registered on the product information management unit N45.

The product information includes the part number ID, the UID, and the position information. The position information includes latitude, longitude, and altitude.

Next, when the registration of the product information of the TV N10A is completed, the registration server N40 generates a server registration completion notification. The server registration completion notification includes (a) image data that is previously stored in the image data storage unit N46 and (b) the operation program stored in the program storage unit N47. Then, the communication unit N44 in the registration server N40 designates an address of the mobile device N20 to be a destination of the server registration completion notification.

The transmission unit N42 transmits the generated server registration completion notification via the communication I/F unit N41 ((4) in FIG. 449).

The receiving unit N29 of the registration server N20 receives the server registration completion notification via the communication I/F unit N27.

The communication unit N30 in the mobile device N20 confirms the destination address of the server registration completion notification, and provides the received server registration completion notification to the program execution unit N23.

The program execution unit N23 executes the operation program included in the server registration completion notification.

Here, the program execution unit N23 executes the operation program to "display image data on the display unit N26."

In more detail, the program execution unit N23 instructs the data processing unit N24 to perform processing for the image data.

The data processing unit N24 thereby performs data processing for the image data. For example, if downloaded image data is compressed, the data processing unit N24 decompresses the image data. If the image data is encrypted, the data processing unit N24 decrypts the image data. The data processing unit N24 may also arrange the downloaded image data in an image display style based on an image display style sheet.

In completing the data processing, the data processing unit N24 provides the processed image data to the memory unit N25 in which the processed image data is temporarily stored.

The display unit N26 displays the image data stored in the memory unit N25.

In this example, the image data accumulated in the memory unit N25 is used to notify a user of that registration of information of a corresponding product is completed without any problem.

(b) in FIG. 451 is a table illustrating an example of pieces of product information managed in the product information management unit N45 of the registration server N40, after pieces of information regarding the other products from the BD recorder N10B to the FF heater N10K are registered in the registration server N40 in the same manner as described for the TV N10A.

Pieces of product information for which registration processing is performed in the house of FIG. 447 are managed in the same table. In this example, products registered using the same mobile device N20 are determined as products for which registration processing is performed in the same house.

FIG. 452 is a flowchart of an example of processing performed by the RF-ID unit N10 to perform product registration.

First, the RF-ID unit N10 of a target product waits for power supply from the mobile device N20 (N001).

If the RF-ID unit N10 receives power from the mobile device N20 (Y at N001), then the processing proceeds to N002. Otherwise (N at N001), the processing returns to N001.

At N002, the RF-ID unit N10 generates product information including information stored in the memory N13. Then, at N003, the RF-ID unit N10 transmits the product information from the antenna N11 to the mobile device N20. Thereby, the processing is completed.

FIG. 453 is a flowchart of an example of processing performed by the mobile device N20 to perform product registration.

First, at N001, the RF-ID reader/writer N21 of the mobile device N20 supplies power to the RF-ID unit N10 of the target product.

Next, the mobile device N20 waits for product information from the RF-ID unit N10 of the target product (N005).

If the mobile device N20 receives product information from the RF-ID unit N10 (Y at N005), then the processing proceeds to N006. Otherwise (N at N005), the processing returns to N004 to supply power to the RF-ID unit N10 again.

At N006, the mobile device N20 analyzes the received product information and thereby executes an operation program included in the product information.

At N007, the mobile device N20 determines a position of the mobile device N20 itself (see the position information obtainment unit 98*j* in FIG. 480).

At N008, the mobile device N20 generates server registration information including information of the determined position.

At N009, the mobile device N20 transmits the generated server registration information to the registration server N40 via the communication I/F unit N27 (see the transmission unit 98*o* in FIG. 480).

Next, the mobile device N20 waits for a server registration completion notification from the registration server N40 (N010).

If the mobile device N20 receives the server registration completion notification from the registration server N40 (Y at N010), then the processing proceeds to N011.

At N011, the mobile device N20 analyzes the server registration completion notification. Then, at N012, the mobile device N20 displays, on the display unit N26, image data included in the server registration completion notification. Thereby, the processing is completed.

FIG. 454 is a flowchart of an example of processing performed by the registration server N40 to perform product registration.

First, the registration server N40 waits for server registration information from the mobile device N20 (N013).

If the registration server N40 receives the server registration information from the mobile device N20 (received at N013), then the processing proceeds to N014. Otherwise (not received at N013), the processing returns to N013.

At N014, the registration server N40 analyzes the received server registration information to determine whether or not a login name and a password included in the server registration information are correct. If the login name and the password are correct, then, at N015, the registration server N40 stores the product information into the product information management unit N45.

At N016, the registration server N40 generates a server registration completion notification that includes an operation program and image data. At N017, the registration server N40 transmits the generated server registration completion notification from the communication I/F unit N41 to the mobile device N20. Thereby, the processing is completed.

Next, the following describes an example of a method of controlling a product having the RF-ID unit N10 by using the position information of the mobile device N20, with reference to FIGS. 455 and 456.

FIG. 455 is a sequence diagram illustrating an example of controlling power for the air conditioner N10J and the TV N10A, when the mobile device N20 is moved from the first floor to the second floor.

The CPU N34 in the mobile device N20 monitors the position information stored in the position information storage unit N33 to determine whether or not predetermined conditions are satisfied. If the predetermined conditions are satisfied, then the CPU N34 generates positional information including position information that is information of a current position of the mobile device N20 (hereinafter, referred to as "current position information").

FIG. 456 is a table illustrating an example of a structure of positional information and product control information according to Embodiment B4 of the present invention.

(a) in FIG. 456 is a table illustrating an example of a structure of the positional information.

The positional information includes (a) second server login ID and a second server login password which are regarding the registration server N40 and (b) current position information. The second server login ID and the second server login password are previously obtained in purchasing the product and stored in a memory (not shown). The current position information is obtained from the position information storage unit N33.

The communication unit N30 designates, as a destination of the positional information, an address of the registration server N40 in which information of the product is registered.

The transmission unit N28 transmits the positional information to the registration server N40 via the communication I/F unit N27 ((1) in FIG. 455).

The receiving unit N43 in the registration server N40 receives the positional information via the communication I/F unit N41.

The communication unit N44 in the registration server N40 confirms the second server login ID and the second server login password in the received positional information.

If the second server login ID and the second server login password are correct, then the communication unit N44 provides the positional information to the product control unit N49.

The product control unit N49 provides the second server login ID to the position information generation unit N48.

According to instructions from the product control unit N49, the position information generation unit N48 obtains pieces of product information as illustrated in (b) in FIG. 451 from the product information management unit N45 based on the second server login ID. Then, the position information generation unit N48 generates a product map from pieces of position information of the respective products. The product map shows positions of the products in the house illustrated in FIG. 447. The position information generation unit N48 provides the generated product map to the product control unit N49.

FIG. 457 illustrates an example of the product map generated by the position information generation unit N48.

The product map is a 3D map (or 3D product map) in which illustrations of the products are arranged at positions based on the respective pieces of position information.

The product control unit N49 controls the products from the TV N10A to the FF heater N10K, by using (a) the current position information of the mobile device N20 included in the positional information and (b) the product map (or home appliance map) generated by the position information generation unit N48.

In this example, the product control unit N49 turns ON a product at a position closest to the current position information received from the mobile device N20 (without turning ON products at other positions). See, for example, FIG. 486 described later, according to need. Here, the product control unit N49 generates product control information including an instruction for turning ON the air conditioner N10J.

(b) in FIG. 456 is a table illustrating an example of a structure of first product control information.

The first product control information includes: part number ID of the air conditioner N10J; UID of the air conditioner N10J; and a product control command for turning ON the air conditioner N10J.

The communication unit N44 designates an address of the mobile device N20 to be a designation of the first product control information.

The transmission unit N42 transmits the first product control information to the mobile device N20 via the communication I/F unit N41 ((2) in FIG. 455).

After receiving the first product control information, the mobile device N20 transfers the first product control information to the air conditioner N10J based on the part number ID and the UID in the first product control information ((2)' in FIG. 455).

When the air conditioner N10J receives the first product control information from the communication I/F unit N18, the air conditioner N10J turns ON a power source of the air conditioner N10J if the power source is OFF.

Next, the product control unit N49 turns OFF a product located the farthest from the current position information received from the mobile device N20. Here, the product control unit N49 generates product control information including an instruction for turning OFF the TV N10A.

(c) in FIG. 456 is a table illustrating an example of a structure of second product control information.

The second product control information includes: part number ID of the TV N10A; UID of the TV N10A; and a product control command for turning OFF the TV N10A.

The communication unit N44 designates an address of the mobile device N20 to be a designation of the second product control information.

The transmission unit N42 transmits the second product control information to the mobile device N20 via the communication I/F unit N41 ((2) in FIG. 455).

After receiving the second product control information, the mobile device N20 transfers the second product control information to the TV N10A based on the part number ID and the UID in the second product control information ((3)' in FIG. 455).

When the TV N10A receives the second product control information from the communication I/F unit N18, the TV N10A turns OFF a power source of the TV N10A if the power source is ON.

As described above, according to Embodiment B4 of the present invention, proximity wireless communication of RF-ID technology and position information are used to manage, in the registration server N40, positions of products each having the RF-ID unit N10. Thereby, it is possible to automatically control the products according to a current position of the mobile device N20.

Regarding the position information, information detected by the 6-axis sensor N32 (motion sensor) that measures relative position information is used as position information. Therefore, it is possible to update the position information by using the detected results of the 6-axis sensor N32 when the mobile device N20 is outside an area in which the GPS N31 can perform positioning. As a result, correct position information can be obtained even outside the area.

It should be noted that the mobile device N20 according to Embodiment B4 has been described to have the GPS N31 and the 6-axis sensor N32, but the mobile device N20 is not limited to the above-described structure. For example, the mobile device N20 may have only the 6-axis sensor N32.

FIG. 458 is a table illustrating an example of a structure of product information stored in the product information management unit N45.

In this aspect, the product information management unit N45 in the registration server N40 stores pieces of relative position information of products which are relative to a reference point (position information) of the TV N10A which is first registered as illustrated in FIG. 458.

FIG. 459 is a diagram illustrating a product map generated by the position information generation unit N48.

Here, a product map generated by the position information generation unit N48 has axes of an x-coordinate, a y-coordinate, and a z-coordinate as illustrated in FIG. 459.

It should also be noted that it has been described in Embodiment B4 that (a) part number ID and UID of a target product which are stored in the RF-ID unit N10 of the target product and (b) position information of the mobile device N20 are registered to the registration server N40, but the present invention is not limited to the above. For example, if the registration server N40 receives again server registration information regarding a product for which registration has already been completed, the registration server N40 may perform processing as illustrated in FIG. 460.

FIG. 460 is a table illustrating examples of an accuracy identifier according to Embodiment B4 of the present invention.

The following describes FIG. 460.

Referring to FIG. 460, the table includes: (a) accuracy identifiers for identifying an accuracy of position information; (b) part number ID in association with each accuracy identifier; and (c) processing to be performed when position information in re-received server registration information is different from position information registered in the product information management unit N45.

If the registration server N40 determines, based on the part number ID and the UID included in the re-received server registration information, that the position information has already been registered in the product information management unit N45, then the registration server N40 checks the part number ID. If the part number ID indicates a TV, a BD recorder, or an FF heater, the registration server N40 updates the position information in the product information management unit N45 to the position information in the re-received server registration information.

If the part number ID indicates an air conditioner, a solar panel, or a fire alarm, then the registration server N40 notifies the mobile device N20 of the position information stored in the product information management unit N45. The mobile device N20 thereby corrects current position information of the mobile device N20 based on the position information received from the registration server N40.

It should also be noted that FIG. 460 shows the two kinds of accuracy identifiers, but the accuracy identifiers are not limited to the two kinds. It is possible to set more than two kinds of accuracy identifiers for respective different processing.

It should also be noted that the product control unit N49 in Embodiment B4 is included in the registration server N40, but the present invention is not limited to the structure. For example, the product control unit N49 may be included in the mobile device N20 so that the product control unit N49 obtains a product map from the registration server N40 to control products. Besides in the mobile device N20, the product control unit N49 may also be included in a home server (not illustrated) that is connected to the home network 100. In this aspect, the mobile device N20 transmits position information to the home server and obtains a product map from the home server.

FIG. 461 is a diagram illustrating an example of a system according to Embodiment B4.

It should be noted that the mobile device N20 according to Embodiment B4 is connected to the registration server N40 via the home network N100 and the external network N101 by using the communication I/F unit (general-purpose I/F unit) N27, but the present invention is not limited to the above. For example, the mobile device N20 may have a function of serving as a mobile phone so that the mobile device N20 can be connected to the registration server N40 via at least a mobile phone network (for example, Long Term Evolution (LTE)) by using an interface connectable to the mobile phone network, instead of the communication I/F unit N27 (see FIG. 461). Furthermore, the mobile device N20 may have an interface connectable to a circuit network such as WiMAX so as to be connected to the registration server N40 via at least the WiMAX network. Any other networks can be used to connect the mobile device N20 to the registration server N40.

It should also be noted that, in Embodiment B4, the product map generated by the position information generation unit N48 is used to determine how to control products, but the present invention is not limited to the structure. For example, image data of the product map generated by the position information generation unit N48 is transmitted to the mobile device N20 that displays the image data on the display unit N26.

It should also be noted that, in Embodiment B4, the position information generation unit N48 generates the product map based on the information illustrated in (b) in FIG. 434, but the present invention is not limited to the above. For example, pieces product information of products located near the position information of the mobile device N20 in the same house are detected from the product information management unit N45, and then used to generate a product map regarding nearby products in the house. In this aspect, the product control unit N49 performs product control by combining the product map of FIG. 457 and the product map of nearby products. For instance, it is assumed in Embodiment B4 that the TV N10A, which is the farthest from the mobile device N20, is turned OFF but there is a solar panel near the mobile device N20 in the house. Under the assumption, the product control unit N49 controls the TV N10A to be turned ON, for example.

It should also be noted that, in Embodiment B4, the product information management unit N45 in the registration server N40 stores part number ID, UID, and position information of each product, but the present invention is not limited to the above. For example, it is also possible that a power state (ON or OFF) is obtained in real time from each product via the communication I/F unit N18 of the product, and then managed in the product information management unit N45. The product control unit N49 thereby controls power of the TV N10A located the farthest from the mobile device N20 to be kept ON when the predetermined number of products are powered OFF, although it has been described in the above description that the product control unit N49 turns OFF the TV N10A.

It should also be noted that, in Embodiment B4, the product control unit N49 turns OFF a product located the farthest from the mobile device N20 and turns ON a product closest to the mobile device N20. However, the present invention is not limited to the above.

The product control unit N49 may control power to be turned ON or OFF for a plurality of products based on the position information of the mobile device N20.

It should also be noted that, in Embodiment B4, the product control unit N49 turns OFF a product located the farthest from the mobile device N20 and turns ON a product closest to the mobile device N20. However, the present invention is not limited to the above. For example, it is also possible that the CPU N34 in the mobile device N20 stores position information as a movement history into a memory (not illustrated), and regularly provides the movement history to the registration server N40. In this aspect, the registration server N40 estimates, from the movement histories of the mobile device N20, which product is located in which room or which floor, and manages results of the estimation. It is further possible that the product control unit N49 controls power to be turned ON or OFF for each product in the same house based on the estimation results. For example, if it is estimated from the movement histories that the TV N10A and the air conditioner N10C are located in the same room, the product control unit N49 turns OFF the air conditioner N10C when the TV N10A is turned OFF.

In addition to the moving histories, it is also possible to obtain a time of switching ON or OFF each product, thereby estimating which product is in the same room or the same floor.

It should also be noted that, in Embodiment B4, the product information management unit N45 manages the product information illustrated in FIG. 451 or 458, and the position information generation unit N48 generates the product map illustrated in FIG. 457 or 459. However, the present invention is not limited to the above. For example, it is also possible that image data of a room arrangement created by the user is transmitted from the mobile device N20 to the registration server N40, and therefore managed by the product information management unit N45. In this aspect, the position information generation unit N48 generates a product map as illustrated in FIG. 447, by combining (a) product information illustrated in FIG. 451 or 458 and (b) the image data of the room arrangement.

Here, private information such as the image data (see, for example, an image generated by an image generation unit described later) of room arrangement may be applied with encryption different from encryption employed for the product information, and then transmitted from the mobile device N20 to the registration server N40.

It is also possible that private information such as the image data of room arrangement is transmitted to a server different from the server receiving the product information, and a product map is generated with reference to the different server when the registration server N40 generates the product map.

It should also be noted that Embodiment B4 may be combined with any other embodiments. For example, it is possible that the function of the terminal device Y01 according to Embodiment B3 is provided to the RF-ID unit N10 according to Embodiment B4 and the function of the communication device Y02 according to Embodiment B3 is provided to the mobile device N20 according to Embodiment B4. Thereby, the series of processes including the polling, the mutual authentication, and the key sharing illustrated in FIG. 441 can be performed prior to the product registration processing of FIG. 449. Any combination of the embodiments is within a scope of the present invention.

[Embodiment B5]

FIG. 462 is a diagram illustrating an example of an entire system according to Embodiment B5 of the present invention.

Referring to FIG. 462, the system according to Embodiment B5 includes a RF-ID device O50 (see the RF-ID tag 98*f* in FIG. 479), a mobile device O60 (see the mobile communication device 98*b*), a first server O101, and a second server O103.

The RF-ID device O50 is a device having a NFC function. The RF-ID device O50 is included in electronic products such as refrigerators, microwaves, washing machines, TVs, and recording devices. The RF-ID device O50 stores, as product information of a corresponding product, (a) a product serial number that is ID for identifying the product, (b) use history information of the product, (d) error information, and the like into a memory of the product.

The mobile device O060 has a NFC function communicable with the NFC function of the RF-ID unit O50 by proximity wireless communication. The mobile device O60 also has a reader/writer function of reading product information from the RF-ID O50. In addition, the mobile device O60 is a portable device such as a mobile phone terminal and a remote controller terminal for TV.

The first server O101 is a server connected to the mobile device O60 via a general-purpose network such as the Internet in order to communicate with the mobile device O60. The first server O101 has an internal database (DB) in which pieces of RF-ID information read from the RF-ID devices O50 to the mobile device O60 are accumulated.

The second server O103 is a server connected to the first server O101 via a general-purpose network such as the Internet in order to communicate with the first server O101. The second server O103 has an internal database (DB) in which pieces of building information regarding the RF-ID devices O50 are accumulated. Each of the building information is coordinates of a building in which the corresponding RF-ID device O50 is located.

The RF-ID device O50 includes product ID O50, a first server URL O52, service ID O53, and an accuracy identifier O54.

The product ID O51 is ID for identifying a product having the RF-ID device O50. For example, the product ID O51 is a part number (including color information) or a product serial number of the product.

The first server URL O52 is address information of the first server O101.

The service ID O53 is ID for identifying a product classification such as a TV, an air conditioner, or a refrigerator.

The accuracy identifier O54 is information indicating reliability of position information provided from a product with the RF-ID device 10 which has the product ID.

As described above, if the RF-ID device O50 according to Embodiment B5 is moved into proximity of the mobile device O60 to be able to perform proximity wireless communication, the RF-ID device O50 can transmit, to the mobile device O60, the product serial number, the first server URL, the service ID, and the accuracy identifier which are stored in the memory.

Next, the mobile device O60 according to Embodiment B5 is described.

The mobile device O60 includes an antenna O61, a RF-ID reader/writer O62, a coordinate accuracy identification information O63, a CPU O64, a program execution unit O65, a data processing unit O66, a memory unit O67, a display unit O68*d*, a communication antenna O68, a transmission unit O70, a receiving unit O71, a communication unit O72, a position information storage unit O73, a RF-ID storage unit O74, a RF-ID detection unit O75, a URL unit O76, a reproducing unit O77, a relative position calculation unit O78, a coordinate information sending unit O79, a recording unit O80, a building coordinate information output unit O81, a registered-coordinate unit O82, a determination unit O83, a reference coordinate unit O84, a position information output unit O85, a position information unit O86, a direction information unit O87, a magnetic compass O88, a direction information unit O89, a satellite antenna O90, a position information calculation unit O91, position information O92, position information correction unit O93, a direction information correction unit O94, an angular velocity sensor O95, an angular velocity sensor O96, an angular velocity sensor O97, an acceleration sensor O98, an acceleration sensor O99, an acceleration sensor O100, an integrator O105, an integrator O106, and an absolute coordinate calculation unit O107.

The antenna O61 supplies power towards any RF-ID devices so as to search for a RF-ID device with which the mobile device O60 can perform proximity wireless communication. In receiving a response, the antenna O61 establishes proximity wireless communication with the responding RF-ID device O50 to receive modulated information from the RF-ID device O50.

The RF-ID reader/writer O62 demodulates the received modulated information.

The coordinate accuracy identification information O63 extracts an accuracy identifier from the received information.

The CPU O64 controls a system of the mobile device O60. The CPU O64 controls operations of each unit included in the mobile device O60.

The program execution unit O65 executes a program based on the service ID included in the received information.

The data processing unit O66 performs data processing for information transmitted from the first server O101.

The memory unit O67 temporarily stores the information processed by the data processing unit O66.

The display unit O68*d* displays the information stored in the memory unit O67.

The communication antenna O68 is connected to a general-purpose network such as the Internet.

The transmission unit O70 modulates information to be transmitted to the general-purpose network such as the Internet.

The receiving unit O71 demodulates information received via the general-purpose network such as the Internet.

The communication unit O72 generates and analyzes information to be exchanged (transmitted and received) in communication with other devices via the general-purpose network such as the Internet.

The position information storage unit O73 stores position information generated by the mobile device O60.

The RF-ID storage unit O74 holds product ID and service ID which are obtained from the RF-ID device O50.

The RF-ID detection unit O75 detects a response from the RF-ID device O10.

The URL O76 extracts the first server URL from the information received from the RF-ID device O50.

The reproducing unit O77 reproduces the position information stored in the position information storage unit O73.

The relative position calculation unit O78 calculates relative position information from (a) the position information which is obtained from the position information storage unit O73 and then reproduced and (b) position information of a current position (current position information) of the mobile device O60.

The coordinate information sending unit O79 provides other units with the position information of the mobile device O60 which is generated at a timing of receiving a trigger from the RF-ID detection unit O75.

The recording unit O80 writes the position information provided from the coordinate information sending unit O79, into the position information storage unit O73.

The building coordinate information output unit O81 extracts building coordinate information from the information received by the communication antenna O68.

The registered-coordinate unit O82 extracts registered coordinate information from the information received by the communication antenna O68.

The determination unit O83 examines (determines) an accuracy of the registered coordinate information extracted by the registered-coordinate unit O82.

If the determination unit O83 determines that the registered coordinate information is reliable, then the reference coordinate unit O84 sets the registered coordinate information to be reference coordinate information and provides the reference coordinate information to the position information correction unit O93.

The position information output unit O85 generates position information using direction information provided from the direction information unit O87 and position information provided from the position information unit O86, and provides the generated position information to another unit.

The position information provided from the position information unit O86 and the direction information provided from the direction information unit O87 are position information of the mobile device O60 which is provided form the absolute coordinate calculation unit O107 that includes the position information correction unit O93 and the direction information correction unit O94.

The magnetic compass O88 determines a direction.

The direction information unit O89 generates direction information from information detected by the magnetic compass O88.

The satellite antenna O90 communicates with satellites (see the GPS device 98*j*1*x* in FIG. 481).

The position information calculation unit O91 calculates position information of the mobile device O60 from a result of the communication with the satellites. For example, the position information calculation unit O91 calculates longitude, latitude, and altitude of the position of the mobile device O60.

The position information unit O92 generates position information from the position information generated by the position information calculation unit O91.

The position information correction unit O93 corrects a result of position information obtained from the integrators O105 and O106, by using pieces of information provided from the position information O92, the reference coordinate unit O84, and the building coordinate information output unit O81.

The direction information correction unit O94 corrects a result of direction information obtained from the integrators O105 and O106, by using the information provided from the direction information unit O89.

The angular velocity sensor O95 measures an angular velocity in the x-axis direction of the mobile device O60.

The angular velocity sensor O96 measures an angular velocity in the y-axis direction of the mobile device O60.

The angular velocity sensor O97 measures an angular velocity in the z-axis direction of the mobile device O60.

The acceleration sensor O98 measures an acceleration in the x-axis direction of the mobile device O60.

The acceleration sensor O99 measures an acceleration in the y-axis direction of the mobile device O60.

The acceleration sensor O100 measures an acceleration in the z-axis direction of the mobile device O60.

The integrator O105 integrates results of the measurement of the angular velocity sensors O95, O96, and O97.

The integrator O106 integrates results of the measurement of the acceleration sensors O98, O99, and O100.

The absolute coordinate calculation unit O107 includes the position information correction unit O93 and the direction information correction unit O94, in order to calculate absolute coordinates of the mobile device O60.

As described above, the mobile device O60 according to Embodiment B5 can determine a position of the mobile device O60 when the mobile device O60 receives the product information from the RF-ID device O50, thereby generating position information of the mobile device O60. Thereby, the mobile device O60 transmits, to the first server O10, the position information and the product information of the product having the RF-ID device O50 in association with each other.

In addition, (a) the reference coordinates and the building coordinate information which are generated from the registered coordinates received from the RF-ID device O50, (b) the position information generated by the position information unit O92, and (c) the information generated by the direction information unit O89 allow the current position information of the mobile device O60 to be corrected.

In addition, combination of the registered coordinate information in the first server O101 and the building coordinate information in the second server O103 makes it possible to generate a 3D product map of a building in which a product having the RF-ID device 10 registered by using the mobile device O60 is located. It is also possible to display the generated 3D product map on the display unit O68*d*.

Next, the first server O101 according to Embodiment B5 is described.

The first server O101 is a server connected to the mobile device O60 via a general-purpose network such as the Internet. The first server O101 includes a registered-coordinate information unit O102 in which pieces of information regarding products having the RF-ID devices O50 are managed.

The registered-coordinate information unit O102 receives the information of the RF-ID device O10 and the information of the mobile device O60 which are in association with each other. The registered-coordinate information unit O102 manages the information of the mobile device O60 as parent device information and the RF-ID device O50 as child device information in association with each other. The child device information is added with the position information generated by the mobile device O60 so as to manage also information indicating whether the terminal device (product having the RF-ID device O50) exists. In addition, combination of the building coordinate information received from the second server O103 and the information in the registered-coordinate information unit O102 makes it possible to generate a 3D product map of products including the mobile device O60 arranged in the corresponding building.

Next, the second server O103 according to Embodiment B5 is described.

The second server O101 is a server connected to the first server O103 via the general-purpose network such as the Internet. The second server O103 includes a building coordinate database O104 in which a room arrangement and coordinates of each existing building (for example, longitude, latitude, and altitude) are managed in association with each other.

The room arrangement and coordinates of each existing building stored in the building coordinate database O104 can be combined with the registered coordinate information registered in the first server O103 in order to generate a 3D product map of products including the mobile device O60 arranged in the corresponding building. The building coordinate database O104 may be managed as private information in a server having security higher than that of the first server O101 (for example, a server having setting of preventing the server from directly communicating with the mobile device O60). In this aspect, it is possible reduce leakage of the private information.

As described above, in the system according to Embodiment B5, the product information of the product having the RF-ID device O50 is read by the mobile device O60 using proximity wireless communication. Then, the mobile device O60 transmits, to the first server O103, (a) the product information received from the RF-ID device O50 and (b) the position information generated by touching the RF-ID device O50 by the mobile device O60 to perform proximity wireless communication, which are in association with each other. The first server O103 can manage the information of the mobile device O60 as parent device information and the information of the product having the RF-ID device O50 as child device information, in association with each other. In addition, if relative positions of such products having the RF-ID devices O50 are calculated using pieces of the position information of the products, the relative positions can be used to generate a 3D map of the products.

In addition, the system includes the second server O103 having a database in which a room arrangement and coordinates of each building are managed. The room arrangement and coordinates are combined with pieces of position information of products which are managed in the first server O101. Thereby, it is possible to generate a 3D map (3D product map) of the products having the RF-ID devices O50 arranged in each building.

Moreover, the mobile device O60 can correct the current position information of the mobile device O60 by using (a) the reference coordinates and the building coordinate information which are generated from the registered coordinates received from the RF-ID device O50, (b) the position information generated by the position information unit O92, and (c) the information generated by the direction information unit O89.

The following describes processing of registering the product information of the product having the RF-ID device O50 into the first server O101.

If the mobile device O60 touches the RF-ID device O50 to be able to perform proximity wireless communication with the RF-ID device O50, the mobile device O60 supplies power to the RF-ID device O50 that thereby starts operating.

With the power supply, the RF-ID device O50 modulates the product ID O51, the first server URL O52, the service ID O53, and the accuracy identifier O54. The RF-ID device O50 then transmits the modulated pieces of information to the mobile device O60.

In receiving the product ID O51, the first server URL O52, the service ID O53, and the accuracy identifier O54 by the antenna O61, the mobile device O60 demodulates the received pieces of information in the RF-ID device O62.

The URL unit O75 extracts the first server URL O52 and provides the extracted first server URL O52 to the communication unit O72.

The RF-ID storage unit O74 stores the product ID O51 and the service ID O53.

The coordinate accuracy identification information O63 extracts the accuracy identifier O54 and provides the extracted accuracy identifier O54 to the determination unit O83.

The RF-ID detection unit O75 provides the coordinate information sending unit O79 and the reference coordinate unit O84 with a trigger for notifying of the receipt of the pieces of information from the RF-ID device O50.

In receiving the trigger, the coordinate information sending unit O79 provides the communication unit O72 with the position information of the mobile device N60 which is received from the position information output unit O85.

Here, the description is given for the position information of the mobile device O60 outputted by the position information output unit O85.

First, the absolute coordinate calculation unit O107 receives (a) a result of integrating, by the integrator O105, results detected by the angular velocity sensors O95 to O97 and (b) a result of integrating, by the integrator O106, results detected by the acceleration sensors O98 to O100.

In the absolute coordinate calculation unit O107, the position information correction unit O93 and the direction information correction unit O94 correct the results of the integrators O105 and O106 by using the information stored in the position information unit O92 and the information stored in the direction information O89. The information stored in the position information unit O92 is a calculation result of the position information calculation unit O91 using the satellite antenna O90. The information stored in the direction information O89 is a direction indicated by the magnetic compass O88.

Next, the absolute coordinate calculation unit O107 provides the corrected direction information in the direction information unit O87 and the corrected position information in the position information unit O86.

The position information output unit O85 generates position information from the corrected direction information in the direction information unit O87 and the corrected position information in the position information unit O86.

By the above-described processing, the mobile device O60 eventually generates position information (current position information) of the mobile device O60.

Then, the program execution unit O65 provides the product ID and the service ID, which are stored in the RF-ID storage unit O74, to the communication unit O72.

The communication unit O72 generates data (information) including (a) the position information provided from the coordinate information sending unit O79 and (b) the product ID and the service ID provided from the program execution unit O65. The communication unit O72 designates the first server URL notified from the URL unit O76 to be a destination address of the data, and provides the data and the address to the transmission unit O70. The transmission unit O70 modulates the data and transmits the modulated data to the first server O101 via the communication antenna O68.

In receiving the data from the mobile device O60, the first server O101 demodulates the modulated data.

The registered-coordinate information unit O102 stores the information of the mobile device O60 as parent device information and the information of the RF-ID device O50 as child device information in association with each other. In more detail, the product ID O51 and the service ID O53 which are information of the product having the RF-ID device O50 (child device) are managed in association with the position information of a position at which the mobile device O60 (parent device) receives the product ID O51 and the service ID O53 from the RF-ID device O50.

The following describes processing performed by the mobile device O60 to generate a 3D map of products (a 3D product map). Each of the products has the RF-ID device 10 and has been registered by the mobile device O60 onto the first server O101.

FIG. 463 is a diagram illustrating an example of an arrangement of the products having the RF-ID units O50 according to Embodiment B5 of the present invention.

In a living room on the first floor, a TV O50A, a BD recorder O50B, and an air conditioner O50C are arranged. In a Japanese room on the first floor, an air conditioner O50D is arranged. On the second floor, a TV O50E and an air conditioner O50F are arranged. Each of the above products is embedded with the RF-ID device O50.

It is assumed that coordinates of a position of each product have already been registered to the registered-coordinate information unit O102 connected to the first server O101, by using the mobile device O60 employing the above-described processing for registering product information stored in the RF-ID device O50.

First, the communication unit O72 in the mobile device O60 generates product information request data to be used to request the first server O101 to provide the product information registered by using the mobile device O60.

The transmission unit O70 modulates the product information request data and transmits the modulated data to the first server O101 via the communication antenna O68.

In receiving the product information request data, the first server O101 generates product information response data and transmits the generated data to the mobile device O60. The product information response data includes the child product information that managed in association with the mobile device O60 as its parent device.

In this example, the product information response data includes the product ID O51, the service ID, and the position information regarding each of the TV O50A, the BD recorder O50B, the air conditioner O50C, the air conditioner O50D, the TV O50E, and the air conditioner O50F.

Next, the first server O101 transmits the same product information response data to the second server O103.

Based on the position information of each product included in the product information response data, the second server O103 extracts, from the building coordinate database O104, image data including position (coordinate) information of a building (hereinafter, "building coordinate information") located at the same position as that of each product.

FIG. 464 illustrates the building coordinate information extracted from the building coordinate database O104.

The building coordinate information includes an image of a room arrangement and position information of a building.

The second server O103 transmits the extracted building coordinate information to the mobile device O60.

The receiving unit O71 in the mobile device O60 receives the product information response data via the communication antenna O68, then modulates the received information, and provides the modulated information to the communication unit O72.

The communication unit O72 provides the modulated information to the program execution unit O65.

FIG. 465 is a diagram illustrating an example of image data of a 3D map of products which is generated by the program execution unit O65.

The program execution unit O65 generates image data of a 3D map of products as illustrated in FIG. 465, using the position information of each of the products which is information included in the product information response data. In the 3D map, the products are mapped as different icons on respective coordinates based on the corresponding position information, so that the user can learn the arrangement of the products at a glance.

The program execution unit O65 provides the generated image data to the data processing unit O66.

The data processing unit O66 provides the image data to the memory unit O67 in which the image data is temporarily stored.

The display unit O68*d* displays image data of the 3D map of products illustrated in FIG. 464 which is stored in the memory unit O67.

Next, in receiving the building coordinate information from the second server O103 via the communication antenna O68, the receiving unit O71 in the mobile device O60 demodulates the received building coordinate information, and provides the demodulated information to the building coordinate information output unit O81.

The building coordinate information output unit O81 analyzes the building coordinate information and provides the building coordinate information to the display unit O68*d*.

FIG. 466 is a diagram illustrating an example of a 3D product map.

The display unit O68*d* displays image data of a 3D product map as illustrated in FIG. 466. The displayed image data is a combination of the image data of FIG. 464 and the already-displayed image data of FIG. 465.

As described above, it is possible to generate a 3D product map which the user having the mobile device O60 can see an arrangement of products at a glance.

Next, the description is given for the processing performed by the mobile device O60 to correct the position information of the mobile device O60 by using the building coordinate information.

It is assumed in this example that product information of the air conditioner O50D in FIG. 463 is to be registered to the first server O101.

Here, the processing until when the first server O101 receives data including product ID and service ID from the mobile device O60 is the same as the processing described previously, and therefore is not explained again below.

In receiving the product information of the air conditioner O50D, the first server O101 transmits the position information of the air conditioner O50D to the second server O103.

The second server O103 extracts, from the building coordinate database O104, the building coordinate information of FIG. 464 corresponding to the position information of the air conditioner O50D. Then, the second server O103 transmits the extracted building coordinate information to the first server O101.

If the product to be registered is a product usually fixed to a wall or somewhere, such as an air conditioner, the first server O101 compares (a) the position information of the air conditioner that is indicated in the building coordinate information to (b) the position information of the air conditioner that is generated by the mobile device O60. If the position information of the air conditioner that is generated by the mobile device O60 is not close to a wall, the first server O101 transmits, to the mobile device O60, the position information (hereinafter, referred to also as "building coordinate information) of the air conditioner that is indicated in the building coordinate information.

In receiving the building coordinate information, the receiving unit O71 in the mobile device O60 demodulates the building coordinate information and provides the demodulated information to the building coordinate information output unit O81. The building coordinate information output unit O81 determines, based on the building coordinate information and the position information of the air conditioner, that the current position information of the mobile device O60 is to be corrected. Then, the building coordinate information output unit O81 provides the building coordinate information to the position information correction unit O93.

The position information correction unit O93 corrects the current position information of the mobile device O60 based on the building coordinate information provided from the building coordinate information output unit O81.

Next, the mobile device O60 registers information of the air conditioner O50D into the first server O101 in association with the corrected current position information of the mobile device O60.

As described above, (a) the position information of the air conditioner that is indicated in the building coordinate information is compared to (b) the position information of the air conditioner that is generated by the mobile device O60. Thereby, it is possible to determine whether or not (b) the position information of the air conditioner that is generated by the mobile device O60 is deviated from a correct position. As a result, the position information of the mobile device O60 can be corrected.

It should be noted that it has been described that the first server O101 receives the building coordinate information from the second server O103 for the determination. However, the present invention is not limited to the above. For example, it is also possible that the mobile device O60 obtains the building coordinate information from the second server O103 before transmitting information to be registered to the first server O101 and that the mobile device O60 compares the building coordinate information to the position information of the air conditioner O50D to determine whether or not the position information of the mobile device O60 is to be corrected.

Next, the description is given for the processing performed by the mobile device O60 to correct the position information of the mobile device O60 by using the accuracy identifier.

It is assumed that the product information of the air conditioner O50C in FIG. 463 has already been registered to the first server O101 and the mobile device O60 touches the air conditioner O50C.

When the mobile device O60 receives, via the antenna O61, the product ID O51, the first server URL O52, the service ID O53, and the accuracy identifier O54 from the RF-ID device O50 of the air conditioner O50C, the RF-ID unit O62 in the mobile device O60 demodulates these pieces of information.

At this stage, the mobile device O60 does not know whether the product information of the air conditioner O50C has already been registered in the first server O101. Therefore, the mobile device O60 transmits, to the first server O101, data including the position information of the mobile device O60, the product ID, and the service ID by the product registration processing as described previously.

In receiving the data from the mobile device O60, the first server O101 demodulates the received data.

If the registered-coordinate information unit O102 determines that the product information of the air conditioner O50C has already been registered, then the first server O101 generates data including the position information of the air conditioner O50C that is registered in the registered-coordinate information unit O102, and then transmits the generated data to the mobile device O60.

When the receiving unit O71 in the mobile device O60 receives the position information of the air conditioner O50C via the communication antenna O68, the receiving unit O71 demodulates the received position information and provides the demodulated information to the registered-coordinate unit O82.

The registered-coordinate unit O82 extracts the position information from the data including the position information of the air conditioner O50C, and provides the extracted position information to the determination unit O83.

The determination unit O83 determines whether or not the position information received from the registered-coordinate unit O82 is to be reference coordinates, based on the accuracy identifier O54 of the RF-ID device O50 received from the coordinate accuracy identification information O63.

FIG. 467 illustrates processing performed by the determination unit O83 based on each accuracy identifier.

Regarding the accuracy identifier O54, the RF-ID device O50 is previously assigned with an accuracy identifier for identifying each different product as illustrated in FIG. 467.

Here, the air conditioner O50C is assigned with the accuracy identifier O54 representing a "high" accuracy.

If the determination unit O83 determines that the position information of the mobile device O60 is to be corrected, then the determination unit O83 provides the position information received from the registered-coordinate unit O82 to the reference coordinate unit O84.

Here, if the accuracy identifier O54 represents a "low" accuracy, then the mobile device O60 determines that it is not necessary to correct the position information of the mobile device O60. Then, the mobile device O60 notifies the determination result to the first server O101. The first server stores the new position information of the air conditioner O50C into the registered-coordinate information unit. Thereby, the processing is completed.

If there is a trigger from the RF-ID detection unit O75, the reference coordinate unit O84 provides the position information received from the registered-coordinate unit O82 to the position information correction unit O93.

The position information correction unit O93 corrects the current position information of the mobile device O60 based on the position information received from the reference coordinate unit O84.

Next, the mobile device O60 notifies the first server O101 of that the position information is completed. Thereby, the processing is completed.

As described above, (a) the position information indicated in the building coordinate information is compared to (b) the position information generated by the mobile device O60. Thereby, it is possible to determine whether or not (b) the position information generated by the mobile device O60 is deviated from a correct position. As a result, the position information of the mobile device O60 can be corrected, thereby preventing unnecessary updating of the position information.

Furthermore, products which are usually not moved from an initial equipped location are designated in a group of products having a high accuracy of the position coordinates. Thereby, reliability of the accuracy can be improved.

If even position information of a product in the group having a high accuracy is deviated from a correct position more than predetermined times, it is possible not to correct the position information newly generated by the mobile device O60, but to correct the position information registered in the registered-coordinate information unit O102.

It should be noted that it has been described that the mobile device O60 determines, based on the accuracy identifier, whether or not the position information is to be corrected.

However, the accuracy identifier may be transmitted to the first server O101 so that the first server O101 determines the necessity of the correction.

Next, the description is given for processing performed by the mobile device O60 to manage relative positions of the products.

Here, product registration is first performed for the TV O50A. Then, with reference to the position information of the TV O50A as a reference point, relative position information is generated for the BD recorder O50B that is registered next.

When the mobile device O60 receives, via the antenna O61, the product ID O51, the first server URL O52, the service ID O53, and the accuracy identifier O54 from the RF-ID device O50 of the TV O50A, the RF-ID unit O62 in the mobile device O60 demodulates these pieces of information. The coordinate information sending unit O79 in the mobile device O60 provides the recording unit O80 with the position information determined in detecting the RF-ID device O50.

In receiving the position information, the recording unit O80 records the received position information onto the position information storage unit O73.

After that, in the same product registration processing as described earlier, the mobile device O60 registers the product information of the TV O50A into the first server O101.

Next, the mobile device O60 registers product information of the BD recorder O50B.

When the mobile device O60 receives, via the antenna O61, the product ID O51, the first server URL O52, the service ID O53, and the accuracy identifier O54 from the RF-ID device O50 of the BD recorder O50B, the RF-ID unit O62 in the mobile device O60 demodulates these pieces of information.

The coordinate information sending unit O79 in the mobile device O60 provides the recording unit O80 with the position information determined in detecting the RF-ID device O50 of the BD recorder O508.

The recording unit O80 does not record the position information of the BD recorder O50B onto the position information storage unit O73, because the position information of the TV O50A has already been recorded.

In receiving the position information from the coordinate information sending unit O79, the relative position calculation unit O78 obtains the position information of the TV O50A from the position information storage unit O73 via the reproducing unit O77.

Next, the relative position calculation unit O78 calculates relative position information of the BD recorder O50B which is relative to a reference position (or a reference point) that is the position information of the TV O50A obtained via the reproducing unit O77. Then, the relative position calculation unit O78 stores the calculation result into the position information recording unit.

By the above-described processing, it is possible to generate relative position information of a product with reference to a position of a different certain product.

It should be noted that it has been described that relative position information is stored in the mobile device O60. However, the present invention is not limited to the above. It is also possible that the mobile device O60 transmits relative position information to the first server O101 that manages the received relative position information in the registered-coordinate information unit O102.

It should also be noted that it has been described that the position information of the TV O50A for which product registration is performed at the first time is set to be the reference position. However, the present invention is not limited to the above.

For example, a position predetermined by the user may be set to be the reference point (reference position). For instance, the reference point may be a position of an entrance of a building. If the mobile device O60 is a remote controller terminal of a TV, a position of the TV may be the reference point.

FIGS. 468 and 469 illustrate examples of processing of a 3D map according to Embodiment B5 of the present invention.

FIG. 468 is a flowchart illustrating an example of processing (first half) for the 3D map (S421 to S428).

FIG. 469 is a flowchart illustrating an example of processing (second half) for the 3D map (S431 to S434).

In Embodiment B5, the position information storage unit O73 in the mobile device O60 holds relative position information. However, the present invention in not limited to the above. For example, the following aspect is also possible. The coordinate information sending unit O79 in the mobile device O60 provides position information generated by the mobile device O60 to the recording unit O80 every time the position information is generated. The recording unit O80 thereby records the position information onto the position information storage unit O73. The position information storage unit O73 accumulates the position information generated by the mobile device O60. In this aspect, the program execution unit O65 generates trajectory information of the mobile device O60 from pieces of the position information accumulated in the position information storage unit O73. Thereby, a travel of the mobile device O60 can be estimated form the trajectory information.

It should be noted that it has been described in Embodiment B5 that the processing of the determination unit O83 is performed based on the two kinds of accuracy identifiers in FIG. 467. However, the present invention is not limited to the above. For example, the following is also possible. Two or more kinds of product classification are set. A threshold value is defined for each kind of the classification to represent a different size of deviation from the position information. Based on the threshold value, the determination unit O83 determines whether or not to correct the position information of the mobile device O60.

It should also be noted that Embodiment B5 may be combined with any other embodiments of the present invention. For example, it is also possible that the function of the communication device M1101S according to Embodiment B2 is provided to a product having the RF-ID device O50, and the 3D map (3D product map) as well as home ID are shared among products within the same house. In this aspect, each product obtains the 3D map beforehand from the mobile device O60 using the NFC function.

It should also be noted that it has been described in Embodiment B5 that the RF-ID device O50 is provided to TVs, BD recorders, air conditioners, and the like, but the present invention is not limited to this.

FIG. 470 illustrates a system including products O50G to O50N each having the RF-ID device O50.

Each of the products O50G to O50N also includes a specific small power wireless communication device (for example, ZigBee), which enables the products to directly communicate with each other within a range in which radio waves can be received. It is assumed that each of the products O50G to O50N has already obtained a 3D map from the mobile device O60 via the RF-ID device O50. The 3D map shows an arrangement of the products O50G to O50N. Or, for another method, each of the products O50G to O50N may have the communication antenna O68 in order to obtain, via the internet, the 3D map showing the product arrangement.

The following describes the situation where a product O50H transmits data to a product O50K by using the specific small power wireless communication device. The specific small power wireless communication device usually operates at a sleep mode in terms of power saving. At the sleep mode, a power source of the specific small power wireless communication device is switched ON or OFF at regular intervals. Here, timings of switching ON or OFF for the products are in synchronization with each other.

When the product O50H needs to transmit data, the specific small power wireless communication device in the product O50H is switched to an awake mode. At the awake mode, the power source of the specific small power wireless communication device is always ON.

The product O50H examines the 3D map showing the arrangement of the products O50G to O50N, which has previously been obtained. From the 3D map of the product arrangement, the product O50H determines products located between the product O50H and the product O50K. In this example, a product O50J is determined from the 3D map to be a relay product to relay data.

The product O50H instructs the product O50J to switch to the awake mode.

The product O50H transmits, to the product O50J, data addressed to the product O50H.

When the product O50J receives the data addressed to the product O50H, the product O50J transfers the data to the O50H. Then, the product O50J is switched to the sleep mode.

As described above, using the 3D map, the product O50H determines a relay product in order to transmit data, and causes only the determined relay product (product O50J) to be switched to the awake mode. Thereby, other products, which do not need to be at the awake mode, do not need to be switched to the awake mode. Without the 3D map, in order to establish a path to the product O50K, the product O50H needs to cause all products to be switched to search for the path.

It should also be noted that the embodiment of the present invention employs the 3D map that is a wireframe image of a house. However, such house data is private information, and 3D data is not generated for old buildings. Therefore, until such 3D data becomes available for each general house, it is necessary to obtain a room arrangement of a house without using 3D data of the house.

When there is no 3D data of a house, an illustration is provided. In the illustration, several air conditioners are arranged in a space that corresponds to the house. Without 3D data, a room arrangement of a room having each of the air conditioners is not known.

Here, each of the air conditioners, which has a RF-ID unit compliant to APE, is provided with a detection unit (such as an ultrasonic sensor or an infrared sensor) for detecting a distance or a position. Thereby, it is possible to determine a relative position of the air conditioner which is relative to walls and pieces of furniture in the room. Here, a mobile phone which has the 3D mapping function as described in the embodiment of the present invention is brought into proximity of the RF-ID unit in the air conditioner. At this moment, the mobile device reads a product name, a product serial number, a MAC address, and an authentication key from the RF-ID unit. Then, in transmitting these pieces of information to a server, the mobile device also transmits, to the air conditioner or the server, 3D absolute coordinate information indicating the position of the mobile device. As a result of calibration using the previously-described coordinate information of the relative position of the room and the absolute coordinate information, it is possible to generate a 3D or 2D arrangement illustration of absolute coordinates of the air conditioner and the room. Combination of pieces of 3D coordinate information of the several air conditioners can result in coordinate information showing a 3D or 2D arrangement of the rooms having the air conditioners in the house, in other words, the wireframe image.

Since pieces of authentication data, such as the MAC address and the authentication key, which are used to be connected with other devices, are also obtained, it is possible to automatically perform connection authentication with the other devices, such as TVs, a DVD recorder, and a refrigerator, in the house via a network. This terminal is not necessary to be the air conditioner, but also to be any electric and electronic devices in the house. Air purification device may be provided with a distance measuring sensor to server as the terminal. However, the terminal is desirably a device, such as an air conditioner, which is equipped at a fixed location in a house, because position coordinate information of such a device is not changed. In this example, 3D coordinate information of only the rooms having the air conditioners can be generated. However, since a user of the mobile device moves around in the house, 3D trajectory information can be generated. The 3D trajectory information regarding position coordinates is analyzed and calculated by a server to estimate positions of entrances of the respective rooms, positions of corridors, and other positions. Thereby, the 3D data showing the arrangement of the house is further developed. The above method can generate the 3D wireframe image of the house, without 3D coordinate information of the house. Furthermore, in the method by which the RF-ID unit of the mobile device touches the RF-ID reader at a front door of the house so as to unlock the key of the entrance, if the position of the RF-ID reader which is recorded onto the server or the RF-ID reader has a high accuracy, this means that an accuracy identifier of the position coordinates is high. The mobile device detects high accuracy by checking this. Therefore, touching the RF-ID unit, the mobile device can calibrate absolute coordinates of the position of the mobile device. Thereby, single touching can result in (a) locking/unlocking of the key and (b) calibration of coordinates.

Note that the correction is performed based on the information in the direction information unit O89, as mentioned above. The direction information unit O89 may be information, or a functional block for processing the information. The same applies to the other reference signs, according to need.

[Embodiment B6]

The following describes Embodiment B6 of the present invention.

FIG. 471 is a diagram illustrating a home network environment assumed in this embodiment.

A wireless home network is established in each of houses M2002, M2003, M2004, and M2005. Each home network is connected to a registration server M2001 via the Internet M2006.

In the case where services provided in the home network are limited within the corresponding house, the registration server M2001 may be located in the house (see the server (home server) 99*a* in FIG. 478).

In the assumed environment, a radio wave range of each wireless AP (M2007, M2008, M20014, M2015, M2016) covers other homes, and a TV (M2009, M2010, M2017, M2018), a DVD recorder (M2011, M2019), and a digital camera M2012 in each home that connect to the Internet are physically connectable to a plurality of wireless APs.

Moreover, in this embodiment, a mobile terminal such as a mobile phone M2013 is also a terminal included in the home network.

Each appliance (device, apparatus) in this embodiment is capable of simple data communication with each other via a proximity wireless communication device, and obtains information of another appliance via the proximity wireless communication device and registers the information in the registration server M2001 via a home network device.

FIG. 472 is a diagram showing a hardware structure of a terminal according to Embodiment B6 the present invention.

A communication device M2101 (see the mobile communication device 98*b* in FIG. 480) in this embodiment has two communication devices.

One communication device is a proximity wireless communication device M2102, which is typically a device of Near Field Communication (NFC) or RF tag.

The other communication device is an internet communication device M2103. Examples of the internet communication device M2103 include a wireless communication device of a wireless Local Area Network (LAN), ZigBee, or the like used for connecting home appliances with each other, a wired communication device of Ethernet™, Power Line Communication (PLC), or the like, and a communication device of WiMAX, Third Generation Partnership Project (3GPP), or the like used in mobile devices.

The communication device M2101 also includes a user interface (IF) device M2104.

The user IF device mentioned here is an input device such as buttons, a display, and an output device of a LED or the like.

A remote controller is typically used for input/output of an appliance such as a TV or an air conditioner. Though physically separated from the device, the remote controller is also regarded as a user IF device in this embodiment, for simplicity's sake.

The communication device M2101 further includes a position information obtainment device of GPS or the like capable of obtaining geographical position information of the terminal itself. Note that the advantageous effects of the present invention can further be enhanced by obtaining accurate position information through the use of a motion sensor and the like.

FIG. 473 is a functional block diagram illustrating functions executed by a CPU M2106.

A wireless connection request obtainment unit M2202 in the communication device M2101 obtains a wireless connection request from a registration device (appliance) M2201, at the same timing as obtainment of information including a device UID in Embodiment B1. This, however, does not apply in the case where wireless connection is not performed at the time of registration and later a request to connect to a wireless AP is made.

The registration device M2201 transmits wireless connection request information including the wireless connection request and the device UID, from a wireless connection request transmission unit M2203.

A wireless AP information request generation unit M2204 obtains the wireless connection request information including the device UID and the wireless connection request from the wireless connection request obtainment unit M2202, obtains a home ID from a home ID management unit M2205, obtains position information from a position information obtainment unit M2206, and generates a wireless AP information request.

The position information mentioned here is geographical position information that can be obtained by a GPS function of a mobile phone. Since the communication device M2101 is very near the registration device M2201 immediately after proximity wireless communication, position information of the communication device M2101 and position information of the registration device M2201 can be regarded as substantially same position information.

This saves cost for equipping the registration device M2201 with a position information obtainment device of GPS or the like.

A wireless AP information communication unit M2207 receives the wireless AP information request from the wireless AP information request generation unit M2204, and transmits the wireless AP information request to the registration server M2001.

Having received the wireless AP information request, the registration server M2001 transmits information of a wireless AP assumed to be nearest a position according to the position information included in the registration server M2001, and an authentication key for accessing the wireless AP.

Here, information (e.g. a MAC address, position information) of a wireless AP used in each home and a corresponding authentication key are already registered in a wireless AP information database M2208.

The registration may be performed by the wireless AP itself, or by another device connected to the wireless AP.

For example, the information of the wireless AP is a MAC address of the wireless AP, and the authentication key is a WEP key in a wireless LAN.

The use of the home ID is intended to prevent a response indicating a wireless AP that is close in position but belongs to a different home. Meanwhile, the use of the position information is intended to prevent a response indicating a wireless AP that corresponds to the home ID but is positionally hard to connect.

The wireless AP information communication unit M2207 receives the information from the registration server M2001, and transfers the received information to a setting program generation unit M2210.

The setting program generation unit M2210 generates a program for causing the registration device M2201 to automatically set access to the wireless AP, based on the received information.

The program mentioned here is not merely information, but an element that, when received, operates to automatically set access to the wireless AP.

This allows the user to complete the setting to the wireless AP, without operating the registration terminal. Besides, a manufacturer of the registration device does not need to equip the registration device with a user interface which requires a complex operation.

The communication device M2101 transmits the program to the registration device M2201 using the proximity wireless communication device M2102.

In this way, even in the case where the registration device M2201 is not yet set to connect to the Internet or the home network, the program can be transferred securely.

A setting program execution unit M2211 in the registration device M2201 receives the program, and transmits a packet necessary for the setting, to the wireless AP (M2212). The setting program execution unit M2211 thus completes the setting.

FIG. 474 is a sequence diagram illustrating processing for the wireless connection request.

The user who wants to wirelessly connect the registration device M2201 such as the digital camera M2012 transmits, by proximity wireless communication, a device UID of the registration device M2201 and the wireless connection request, to the communication device M2101 that includes a device such as a GPS device capable of obtaining position information and is communicable with the registration server M2001.

The user adds his/her home ID and position information to the device UID in the communication device M2101, and transmits the resulting request to the registration server M2001.

Here, the home ID may be inputted via the user IF device M2104 in the communication device M2101, or may be registered in the communication device M2101 beforehand. Moreover, an ID unique to the communication device M2101 may be used as the home ID.

The registration server M2001 returns information of an optimal wireless AP to be accessed by the registration device M2201 and an authentication key necessary for the access, based on the received information.

It is preferable that these information are transferred reliably and securely by, for example, a 3G internet communication device in a mobile phone.

The communication device M2101 adds a setting command for automatically completing setting of the registration device M2201 to connect to the wireless AP, to the received information. The communication device M2101 transfers the resulting information to the registration device M2201 using the proximity wireless communication device.

The registration device M2201 automatically completes setting of a home network wireless communication device, using the received authentication key.

The home network wireless communication device mentioned here is a device that is connectable from a plurality of devices in a specific range as in a wireless LAN, ZigBee, and the like, and that requires authentication processing for connection. By receiving the authentication key from the registration server M2001 through a secure, reliable path, the user can securely complete setting the connection to the wireless AP, without performing a complex operation such as inputting the authentication key.

FIG. 475 is a flowchart illustrating processing in the communication device M2101 for the wireless connection request.

Upon receiving a registration request, the communication device M2101 determines whether or not the wireless connection request is included in the registration request (M2301).

In the case where the wireless connection request is not included (M2301: NO), the processing specific to this embodiment ends, and the same processing as in Embodiment B1 is performed.

Note that this embodiment is also applicable in the case of receiving only the wireless connection request of an already registered device.

In the case where the wireless connection request is included (M2301: YES), the communication device M2101 generates the wireless connection request including the registration request and the position information (M2302).

The communication device M2101 transmits the generated wireless connection information to the registration server M2001 (M2303), and waits for a response.

In the case where the communication device M2101 is unable to receive the response (M2304: NO), the communication device M2101 notifies the user of a request failure (M2305), and ends the processing.

In the case where the communication device M2101 is able to receive the response (M2304: YES), the communication device M2101 determines whether or not information of a wireless AP is included in the response (M2306). In the case where the information of the wireless AP is not included (M2306: NO), the communication device M2101 notifies the user that there is no accessible wireless AP (M2307), and ends the processing.

Here, a determination condition may be set in the wireless connection request. Moreover, information of a plurality of wireless APs may be returned. This makes it possible to obtain a desired response for the user, instead of merely receiving information of a near wireless AP. In the case where the information of the wireless AP is included (M2306: YES), the communication device M2101 generates a wireless AP setting program (M2308), and transmits the wireless AP setting program by proximity wireless communication (M2309).

[Embodiment B7]

Embodiment B7 of the present invention describes a method of efficiently setting a channel of a wireless communication device. A wireless communication device for an existing home network autonomously performs channel setting, so that the channel setting is carried out based on only local information obtained on the spot. In a situation where wireless communication is performed at all hours in many homes due to the emergence of a HEMS and the like, such a setting method is inefficient. It is preferable to perform channel setting based on channel setting statuses of neighboring homes.

FIG. 476 is a diagram illustrating a network environment in channel setting.

The registration server holds channel information and a cell radius, in addition to information (a MAC address, a home ID, position information, an authentication key) of each wireless AP (see the processor 96*a* in FIG. 485, the access point 99*c* in FIG. 378).

The position information may be position information of the wireless AP, or information of a center point of home appliances in a home unit.

The cell radius is information indicating a range in which the home appliances as a whole interfere with their surroundings.

Through the use of these information, each wireless device can select an optimal channel.

FIG. 477 is a functional block diagram in channel setting.

In FIG. 477, an interference information transmission unit M2250 and an interference information database M2251 are added to the functions in Embodiment B6. The interference information transmission unit M2250 transmits channel interference information of the surroundings of the terminal. This enables estimation of the existence of a device or a wireless AP not registered in the registration server M2001. By transmitting this information to the server, it is possible to avoid a situation where channel setting using the server is less efficient than autonomous channel setting. A sequence for a channel setting request is the same as that for the wireless connection request. Based on the received information, the registration server M2001 selects a channel that has a lowest possibility of being the same channel as a neighboring home, and transmits information of the channel. An algorithm of channel selection may be an algorithm that estimates future channel arrangement, or an algorithm that selects only from current information.

As mentioned earlier, the terminal device Y01 in FIG. 440 is an electronic terminal device (see, for example, the appliance 98*a* in FIG. 480) such as a refrigerator (e.g. the refrigerator M1013 in FIG. 427), a microwave (e.g. the microwave M1012), or a washing machine.

The terminal device Y01 may be a type of terminal device (e.g. the refrigerator M1013, the microwave M1012) that is typically not connected to the general-purpose network Y02N (FIG. 440, the Internet M1004 in FIG. 427), unlike a TV (e.g. the TV M1008 in FIG. 427) or the like connected to the Internet.

In the case where the manufacturer of the terminal device Y01 determines that the terminal device Y01 has a possibility of an occurrence of a trouble, the device management DB Y041 (FIGS. 440, 442) in the server Y04 (FIG. 440) is referenced, as mentioned earlier. As a result, the manufacturer can learn where the terminal device (appliance) Y01 is (the position of the terminal device Y01, a product serial number of a mobile phone terminal of the user using the terminal device Y01), which reduces a product recall time (a time required for recalling the terminal device Y01) and prevents the occurrence of the trouble. This leads to safe and secure product use.

For example, "where the terminal device Y01 is" means in which of a plurality of homes (see the houses M1001 to M1003 in FIG. 427) the terminal device Y01 is located, or at which of a plurality of positions (see, for example, FIG. 447) in the home the terminal device Y01 is located (see first position information and second position information described later).

There is also an instance where the communication device Y02 (see the mobile communication device 98*b* in FIG. 480) has a display function as in a mobile phone terminal (e.g. the mobile phone M1014 in FIG. 427) and the like. In such a case, the following processing can be performed by detecting with which communication device (appliance) Y02 out of a plurality of communication devices Y02 of a plurality of users the terminal device Y01 having a possibility of a trouble can perform proximity wireless communication. That is, the server Y04 or the like causes the corresponding communication device Y02 that can perform proximity wireless communication, to display trouble information of the terminal device Y01. Thus, by transmitting the trouble information of the terminal device Y01 (e.g. the refrigerator M1013, the microwave M1012) which typically has no display function and is not connected to the general-purpose network, to the communication device Y02 corresponding to the terminal device Y01, the user of the terminal device Y01 can be warned of the trouble. Hence, the user of the terminal device Y01 can be provided with an appliance of enhanced safety and security (i.e. the terminal device Y01).

Therefore, when the manufacturer determines that the terminal device Y01 has a possibility of a trouble, the manufacturer can easily recall the terminal device Y01, or display the possibility of the trouble (trouble information) on the display unit (e.g. the display unit Y02*x* in FIG. 440) of the corresponding communication device Y02. This contributes to higher traceability of the product (the terminal device Y01), and provides the user with a safe, secure appliance (the terminal device Y01).

In other words, the following processing may be performed in this system. Here, the following processing may be performed only in a certain situation. Note that the following processing is merely an example.

Devices (home appliances, white goods) such as the refrigerator M1013 and the microwave M1012 are situated in a home (see FIG. 447, the house M1001 in FIG. 427, the home 99 in FIG. 480).

For example, the device Y01 (see the terminal device Y01 in FIG. 440, the appliance 98*a* in FIG. 480) is one of these devices including the refrigerator M1013 and the like.

The home (the house M1001) in which the device Y01 is situated is the home of the user who purchased the device Y01, among a plurality of homes. That is, the user of the device Y01 is a person in the home in which the device Y01 is situated, among a plurality of persons in a plurality of homes.

This being so, there is an instance where the manufacturer of the device Y01 or the like uses information (see the transmission information 98*o*1 in FIG. 480) of the person who purchased the device Y01, i.e. the user of the device Y01, among information (e.g. a name, an address) of the plurality of persons.

In detail, in the case where the device Y01 is determined to have a possibility of a failure, the manufacturer takes an action such as recalling the device Y01 or notifying the user of failure information, according to the determination of the failure possibility of the device Y01.

In this action, the information (e.g. an address) of the user may be used.

Conventionally, a phone number, an address, a name, and the like of the user are used as such user information.

For example, such user information is stored in the server Y04 (see FIG. 440, the registration server M1005 in FIG. 427) of the manufacturer.

In view of this, when transmitting the user information to the server Y04 of the manufacturer or the like, it is desirable that the user information can be easily transmitted without requiring a complex operation by the user.

In many occasions, the user information may simply be the product serial number (see the product serial number Y025N in FIG. 440) of the communication device Y02 (FIG. 440) such as the mobile phone terminal (e.g. the mobile phone M1014 in FIG. 427) of the user.

Moreover, in recent years, the communication device Y02 (e.g. the mobile phone M1014 in FIG. 427) having a function of proximity wireless communication (e.g. communication using a RFID or IC tag) is often used in the home.

It is assumed that a communication device Y02 of a person (see another home 991 of a person who is other than a person in the home 99 in which the appliance 98*a* is installed and who has a mobile phone other than a mobile phone of the person in the home 99 in FIG. 480) not purchasing the device Y01 does not touch the device Y01, and so does not establish the proximity wireless communication with the device Y01. Hence, it is assumed that only the communication device Y02 of the user purchasing the device Y01 touches the device Y01 to establish the proximity wireless communication with the device Y01.

This being the case, the communication device Y02 may detect that the proximity wireless communication is established with the device Y01 (the antenna Y021 in FIG. 440, SY01 to SY03 in FIG. 441).

In the case where the establishment of the proximity wireless communication is detected, information such as the product serial number Y025N in the communication device Y02 is transmitted to the server Y04 of the manufacturer of the device Y01, as the user information of the device Y01 with which the proximity wireless communication is established (the communication unit Y36, SY09 in FIG. 441).

On the other hand, in the case where the establishment of the proximity wireless communication is not detected, the transmission of the information is suppressed.

Thus, merely by purchasing the device Y01 and establishing the proximity wireless communication, the user can easily transmit the information of the user purchasing the device Y01 to the server Y04, without a complex operation.

However, since a plurality of devices Y01 are installed in the home, there is an instance where a plurality of servers Y04 are provided by a plurality of manufacturers of the plurality of devices Y01.

This raises a possibility that the information is transmitted not to an appropriate server Y04 but to an inappropriate server Y04 among the plurality of servers Y04.

This can also lead to a situation where the user needs to input information (see the address Y01Ua in FIG. 450) for specifying the appropriate server Y04 via a keyboard or the like.

In view of the above, the following processing may be performed.

In the case where the user purchased the device Y01, for example when the communication device Y02 of the user is brought to touch the device Y01, the distance between the device Y01 and the communication device Y02 of the user falls below a threshed (e.g. several centimeters).

Here, the refrigerator M1013, the microwave M1012, or the like (the device Y01) may have the following function. In detail, the device Y01 stores the information Y015D in FIG. 440 (the address Y01Ua in FIG. 450) for specifying the server Y04 of the manufacturer of the device Y01 from among the plurality of servers Y04 in the network Y02N, even though the device Y01 is the refrigerator M1013 or the like which is not connected to the network Y02*n* (FIG. 327).

The device Y01 then transmits the stored information Y015D by the proximity wireless communication, when the proximity wireless communication is established.

Meanwhile, the communication device Y02 may perform the following processing, in the case where the distance between the communication device Y02 and the device Y01 is less than the threshold (the antenna Y01 in FIG. 440, SY01 to SY03 in FIG. 441).

In other words, the communication device Y02 may perform the following processing, in the case where the proximity wireless communication is established between the communication device Y02 and the device Y01.

That is, the communication device Y02 may perform the following processing upon detecting the establishment of the proximity wireless communication.

When the establishment of proximity wireless communication is detected, the communication device Y02 obtains the information Y015D (FIG. 327, the address Y01Ua in FIG. 450, described above) for specifying the server Y04 of the manufacturer of the device Y01, from the device Y01 (the refrigerator M1013 or the like) by the proximity wireless communication (SY04 in FIG. 441).

The communication device Y02 then transmits, to the server Y04 specified by the obtained information Y015D from among the plurality of servers Y04, the information (the product serial number Y025N, the information Y036D in FIG. 440, the information Y051 in FIG. 442) held in the communication device Y02 (the memory Y024), as the information of the user of the device (the device Y01) purchased by the user of the communication device Y02 and located (relatively) near the communication device Y02 (the communication unit Y036, SY09 in FIG. 441).

For example, the manufacturer of the device Y01 may use the received transmission information according to need, and communicate (e.g. by phone) with the communication device Y02 having the information (the product serial number Y025N), as mentioned above.

In detail, the transmitted information may be stored in the device management DB Y041 (FIG. 327) in the server Y04 of the manufacturer (see, for example, FIG. 442).

Thus, merely by purchasing the device Y01 and bringing the communication device Y02 within the distance of the threshold from the device Y01, the user can easily transmit the information (the product serial number Y025N (the information Y025D), the information Y036D) of the user purchasing the device Y01, to the server Y04 of the manufacturer of the device Y01.

In addition, the address Y01Ua (FIG. 450) or the like is transmitted from the device Y01 to the communication device Y02 by the proximity wireless communication. This ensures that the information is transmitted to the appropriate server Y04 specified by the obtained address Y01Ua or the like from among the plurality of servers Y04 of the plurality of manufacturers.

Besides, the information can be easily transmitted to the appropriate server 04, with there being no need for the user to input the address Y01Ua via a keyboard.

This contributes to higher traceability of the device Y01 for the manufacturer.

Here, the transmission information Y036D (FIG. 440) including the product serial number Y025N of the communication device Y02 may further include other appropriate information such as the product serial number Y015N of the device Y01 located near the communication device Y02, in addition to the product serial number Y025N of the communication device Y02.

In this case, according to the transmission information Y036D, the user of the communication device Y02 having the product serial number Y025N included in the information Y036D may be specified as the user of the communication terminal Y01 having the other product serial number Y015N.

The transmission information Y036D may also include the information Y027D (FIG. 440) indicating the position of the communication device Y02.

The information Y027D may be information detected by a GPS (Global Positioning System) function. In detail, the GPS function may be a function of the position information determination unit Y027 (FIG. 440) included in the communication device Y02.

The position of the communication device Y02 indicated by the information Y036D (the information Y027D) is, for example, near the position of the device Y01 at a distance within the threshold (e.g. within a distance of several centimeters).

In other words, the information Y027D is information for specifying the position of the device Y01 relatively accurately. For example, the position of the device Y01 may be specified more accurately than an address or a phone number of the home (e.g. the house M1001 in FIG. 427) in which the device Y01 is installed. In detail, the information Y027D may specify at which of a plurality of (many) positions (e.g. the position of the air conditioner N10J, the position of the air conditioner N10C in FIG. 447) in the house M1001 the device Y01 is located.

This prevents to wrongly specify (falsely recognize), as the device Y1 (e.g. the air conditioner N10J in FIG. 447), another device (e.g. the air conditioner N10C) located near the device Y1 such as at 3 to 5 meters. Accordingly, the appropriate device (the air conditioner N10J) can be reliably specified as the device Y1.

Hence, there may be provided a communication device (e.g. the communication device (mobile phone terminal) Y02 in FIG. 440, the mobile phone M1014 in FIG. 427, the mobile device N20 in FIG. 448) that reads terminal device information (e.g. the information Y015D in FIG. 440, the information Y01U (the address Y01Ua) in FIG. 450) from a terminal device (e.g. the terminal device Y01 in FIG. 440, the refrigerator M1013 or the microwave M1012 in FIG. 427, the air conditioner N10J in FIG. 447) by proximity wireless communication (communication by an IC tag or the like), and transmits the read terminal device information to a server (the server Y04 in FIG. 440, the registration server M1005 in FIG. 427) via a general-purpose network (e.g. the network Y02N in FIG. 440, the Internet M1004 in FIG. 427), the communication device including: a terminal device information obtainment unit (e.g. the antenna Y021 in FIG. 440) that obtains the terminal device information (the information Y015D, the information Y01U (FIG. 337)) from the terminal device by the proximity wireless communication, the terminal device information including at least terminal device identification information (e.g. the product serial number Y015N in FIG. 440, the product serial number Y01Un in FIG. 450) for identifying manufacturing information of the terminal device; a communication device information storage unit (e.g. the memory Y024) that stores communication device information (the information Y025D) including at least communication device identification information (e.g. the product serial number Y025N in FIG. 440) for identifying manufacturing information of the communication device; an information adding unit (e.g. the information adding unit Y035) that adds the stored communication device information (the information Y025D) to the obtained terminal device information (the information Y015D, the information Y01U), to generate transmission information (e.g. the information Y036D in FIG. 440, information including both the terminal device information (the information Y015D) and the communication device information (the information Y025D) as a result of the addition) to be transmitted to the server; and a communication unit (e.g. the communication unit Y036 in FIG. 440) that transmits the generated transmission information (the information Y036D) to the server via the general-purpose network, wherein the communication unit specifies the server based on the terminal device information (e.g. the address Y01Ua of the server Y04 (FIG. 450), i.e., the information for specifying, from among a plurality of servers Y04, the appropriate server Y04 (the server Y04 of the manufacturer of the terminal device) to which the transmission information (the information Y036D) of the terminal device is to be transmitted, the information being stored in the terminal device and transmitted from the terminal device) obtained from the terminal device, and communicates with the specified server.

According to this structure, the communication device transmits the information Y036D to the server Y04. Therefore, the device Y1 (e.g. the refrigerator M1013 in FIG. 1) can be realized by the above-mentioned simple structure, and may be a refrigerator (the refrigerator M1013, a home appliance, white goods) or the like which is not connected to the network Y02N. The information Y036D of the device Y01 can be reliably transmitted to the server Y04 regardless of the type of the device Y01.

Moreover, the communication device may further include a position information obtainment unit (the position information determination unit Y027 in FIG. 440) that obtains position information (the information Y027D in FIG. 440) of the communication device (i.e. position information for specifying a position (e.g. a position within several centimeters from the air conditioner N10J (the device Y01) in FIG. 447) of the communication device), wherein the position information obtainment unit obtains the position information (the information Y027D) of the communication device at a timing when the proximity wireless communication between the terminal device and the communication device is established in the terminal device information obtainment unit (the antenna Y021), and the communication device information (the added communication device information (the transmission information Y036D or part of the transmission information Y036D)) includes the position information (the information Y027D) of the communication device obtained by the position information obtainment unit (at the above-mentioned timing).

According to this structure, even when the device Y01 (communication terminal) is merely a refrigerator (e.g. the refrigerator M1013) without a GPS function or the like, the position of the device Y01 is specified by the information Y027D included in the information Y025D which is included in the transmitted information Y036D. Thus, the position of the device Y01 can be reliably specified based on the information Y036D transmitted to the server Y04, regardless of the type of the device Y01.

Besides, the position can be accurately specified because the position is detected at a sufficiently close distance such as several centimeters over which the proximity wireless communication is performed (see the air conditioners N01J and N10C in FIG. 334 mentioned above).

Moreover, the added communication device information may include identification information (e.g. the above-mentioned home ID) of a home (e.g. the house M1001) in which the communication device Y02 is installed or a person using the communication device Y02 (the user of the communication device Y02).

There may also be provided a management method of the terminal device (the device Y01) (i.e. information (the product serial number Y025N) of the terminal device) in the server (the server Y04) which is communicable with the communication device (the communication device Y02) via the general-purpose network, the management method including: obtaining the terminal device information (the information Y015D (the information Y036D) after addition) to which the communication device information (the communication device identification information, the information Y025D, the information Y051 in FIG. 329) is added (SY09 in FIG. 441); and searching a device management database (the device management DB Y041 in FIG. 327) of the server for the communication device identification information (the product serial number Y025D) included in the added communication device information (specifying an appropriate part (the product serial number Y025D) from among a plurality of parts in the information), wherein in the case where the communication device identification information obtained in the obtaining is determined to be not managed (stored) in the device management database as a result of the searching, a new record (see the information Y051 in FIG. 442) of the added communication device information (the information Y025D in FIG. 327) is generated and associated with the terminal device information (the information Y015D in FIG. 440, the information Y052*d* (the information Y052 to Y054) in FIG. 442) obtained in the obtaining, and also the communication device identification information (the product serial number 025N) (which is added to the information Y036D (the information Y015D)) obtained in the obtaining is determined to be already managed in the device management database (after the new record is generated, the device (e.g. the microwave M1012) of the generated new record is determined to be a device whose communication device identification information is registered), and wherein in the case where the terminal device information (e.g. the information Y052 (FIG. 329) of the microwave M1012 (the device Y01), the product serial number Y015D in FIG. 327) is not managed in the record (see the information Y041D in FIG. 442) including the communication device identification information, the obtained terminal device information (the product serial number Y015, the information Y052, i.e., at least one of parts other than the part corresponding to the added product serial number 025N of the communication device Y02) is added to the record.

Setting necessary for a home network may be made in the server Y04 (or another device) by transmitting information in the above way. This enables the user to easily perform setting necessary for a home network, without a complex operation.

Regarding mere details, processing of any appropriate embodiment of the above embodiments is applicable. Regarding mere details, other forms such as a form according to a known technique and a form according to improvement invention are also applicable.

Moreover, a plurality of technical matters described in a plurality of different embodiments in different parts of this description may be combined according to need.

There may also be provided a method including a plurality of appropriate steps out of the steps described above, an integrated circuit including a plurality of functions, a computer program causing a computer to execute the plurality of functions, a communication method for communicating the computer program, a data structure of the computer program, and the like.

In summary, there is the following problem. In home network setting, merely transmitting terminal information by proximity wireless communication is insufficient because statuses of surrounding terminals are unknown. Besides, the user is required of a complex operation.

In view of this, the following solution is provided. A terminal capable of obtaining position information by means of GPS or the like performs proximity wireless communication with a terminal which is subject to home network setting, and the position information when proximity wireless communication is performed is used as position information of the terminal subject to home network setting. This allows the home network setting to be performed based on the position information in consideration of statuses of surrounding terminals.

Hence, for example, a communication device that can simplify various settings in a display device such as a TV which provides information about an item (communication device) is provided. In detail, the image capturing device 1 having the RF-ID unit 47 for performing proximity wireless communication with the RF-ID reader/writer 46 includes: the data receiving unit 105 that receives an input signal; the second memory 52 that stores the UID unit 75 which is identification information for specifying the communication device and the operation program 116 executed by the TV 45 with reference to the UID unit 75; and the data transfer unit 108 that transmits the UID unit 75 and the operation program 116 to the RF-ID reader/writer 46 according to the input signal, wherein the UID unit 75 and the operation program 116 are transferred to the TV 45 via the RF-ID reader/writer 46 (see FIG. 336, etc.).

[Other Variations]

The following describes other variations mentioned at the beginning of this section "Description of Embodiments".

For instance, the mobile communication device described above may have the following structure.

The position information may be an ID (home ID) of a home (the home 99) of installation among a plurality of IDs (home IDs) of a plurality of homes. This position information specifies the home (the home 99) in which the appliance (the appliance 98*a*) is installed from among the plurality of homes (e.g. the homes 99 and 991 in FIG. 480), and indicates a position (the position 99P in FIG. 480) of the specified home from among positions (the positions 99P and 991P) of the plurality of homes, as a position (the position 99P) of the mobile communication device when the proximity wireless communication is performed.

That is, the predetermined position at which the appliance is installed may be inside a home, wherein the mobile communication device stores an ID (home ID) of the home, the ID being information specifying the home of a user of the mobile communication device, and the transmission unit transmits, to the server (the server 98*c*), the transmission information (the transmission information 98*o*1 in FIG. 483) that associates the position information with the ID of the home, to cause the server to store, in association with the ID (a home ID 98*ca*2 in FIG. 483) that is included in the transmitted transmission information as the ID of the home in which the appliance is installed, information (see a product serial number 98*cb*) included in the transmission information other than the ID.

For example, the transmission information may include the position information and the ID that are associated with each other.

Moreover, the predetermined position at which the appliance is installed may be inside a home, wherein the position information obtainment unit obtains the ID from a second server (e.g. the server (home server) 99*a* in FIG. 478) as the position information, the second server being provided in the home (the home 99) in which the appliance is installed and storing the ID of the home.

Moreover, the position information obtainment unit may obtain the position information (the position information 98*j*1 in FIG. 480) stored in a storage unit (e.g. the memory 98*i* in FIG. 479) in the mobile communication device, the position information specifying the mobile communication device (the mobile communication device 98*b*) from among a plurality of devices to specify, as a position (a position 99P) of the home in which the appliance (the appliance 98*a*) is installed, a position (the position 99P) of the home (the home 99) of a user of the specified mobile communication device.

Moreover, the transmission unit may: transmit the transmission information to the server, to cause the (first) server (the server 98*c* in FIG. 480) to store the transmitted transmission information; and when the appliance (the appliance 98*a*) has been moved from the predetermined position (e.g. in the case of dumping (illegal dumping in a mountain or the like)), cause the server to output the position information (position information 98*mb*, i.e. position information indicating the installation position of the appliance 98*a* before dumped) included in the transmission information (transmission information 98*mc*) in the case where the appliance information (the appliance information 98*a*1 in FIG. 480) specifying the moved appliance is the same as the appliance information (appliance information 98*ma* in FIG. 480) that is included in the transmission information (the transmission information 98*o*1 (98*mc*)) stored in the server and specifies the installed appliance (the appliance 98*a*).

According to this structure, the position information of the position before movement is outputted. This contributes to higher traceability.

Moreover, the predetermined position at which the appliance is installed may be inside a home, wherein the transmission unit transmits the transmission information, to cause a predetermined image generation device (e.g. the server 98*c*, see the position information generation unit N48 in FIG. 457) to generate an image (e.g. the map in FIG. 457, the image in FIG. 465) which shows an internal structure (e.g. room arrangement) of the home and in which a display item representing the appliance (the TV N10A) specified by the obtained appliance information in the transmitted transmission information is superimposed (included) at the position (the position of the TV N10A) at which the appliance is installed.

Data (e.g. the above-mentioned image) for specifying a position of each appliance and information (e.g. a type, a product serial number) of the appliance at the position may be generated in this way.

Moreover, the obtained appliance information (the appliance information **98*n*1 in FIG. 480) may be a product serial number of the appliance, the product serial number specifying the installed appliance (the appliance 98*a*) from among the plurality of appliances (see FIG. 480**, etc.).

Moreover, the appliance information obtainment unit may obtain at least one of type information (type information **98*ma*2 in FIG. 484) and function information (function information 98*ma*3) from the installed appliance by the proximity wireless communication, the type information indicating a type of the appliance, and the function information indicating a function of the appliance, wherein the transmitted transmission information (98*o*1**) includes the obtained at least one of type information and function information.

See also FIGS. 451, 458, and the like according to need.

Regarding mere details in the above description, processing according to the above embodiments (Embodiments A and B) such as Embodiment B (e.g. Embodiment B4) is applicable. Processing according to improvement invention or any other appropriate processing is also applicable.

Details of processing in the above embodiments (Embodiments A and B) may be, for instance, as described in "Other Variations".

For example, the following processing may be performed.

The appliance **98*a* (see FIGS. 479 and 480, etc.) such as a TV, a BD recorder (see the BD recorder N10B, etc.), a heater (see the heater N10K, etc.), an air conditioner, a solar panel, a fire alarm, and a solar panel is provided in the home 99 (FIG. 478) (see FIG. 447**, etc.).

In the case where the appliance **98*a* is installed, the predetermined transmission information 98*o*1 (FIG. 480) including information such as a name of the user of the installed appliance 98*a* is transmitted to and stored in the predetermined server 98*c* (see a database 98*m***).

For example, the server **98*c* is a server of a manufacturer of the installed appliance 98*a***.

Here, it is preferable that the user can perform such transmission with a simple operation.

In recent years, in a relatively large number of homes (e.g. the home 99), the user has the mobile communication device **98*b*** (e.g. a mobile phone) which is portable, such as a mobile phone or a smartphone.

Moreover, in recent years, the mobile communication device **98*b* (e.g. a mobile phone) is often used to perform the proximity wireless communication 98*c*1 (FIG. 480**) such as NFC (mentioned above) or RF-ID communication, in electronic money payment, automatic ticket gates, and so on.

For the proximity wireless communication **98*c*1, the user performs, as an example, an operation of touching the mobile communication device to the other device in communication (e.g. the appliance 98*a* in FIG. 480) (see the touching movement 98*b*1, Y060 and Y063 in FIG. 443**, etc.).

The proximity wireless communication **98*c*1 is performed when, as a result of the touching movement 98*b*1 of the mobile communication device 98*b*, the position of the mobile communication device 98*b* is the same position (substantially same position, e.g. within a distance of several centimeters) as the position of the other device in communication (the appliance 98*a*). Meanwhile, the proximity wireless communication 98*c*1 is not performed when the movement 98*b*1** is not made and so the two devices are not at the same position (substantially same position).

FIG. 482 is a flowchart of the mobile communication device **98*b***.

The mobile communication device **98*b* may perform processing illustrated in FIG. 482**.

For example, when the appliance **98*a* is installed in the home 99, the mobile communication device 98*b* is brought to touch the installed appliance 98*a* (see the movement 98*b*1), to perform the proximity wireless communication 98*c*1 between the installed appliance 98*a* and the mobile communication device 98*b***.

In the case where the proximity wireless communication **98*c*1 is performed (S971 in FIG. 482: Yes, see the communication detection unit 98*q* in FIG. 490), the transmission information 98*o*1 is transmitted to the server 98*c* (by a transmission device (e.g. the mobile communication device 98*b***)).

In the case where the proximity wireless communication **98*c*1 is not performed (S971 in FIG. 482: No), on the other hand, the transmission information 98*o*1** is not transmitted.

In detail, determination is made as to whether or not the proximity wireless communication **98*c*1 between the installed appliance 98*a* and the mobile communication device 98*b* is performed (e.g. whether or not the proximity wireless communication is currently enabled) (S971 in FIG. 482, see the communication detection unit 98*q* in FIG. 490**).

In the case of determining that the proximity wireless communication **98*c*1 is performed (S971: Yes), the transmission information 98*o*1 is transmitted. In the case of determining that the proximity wireless communication 98*c*1 is not performed (S971: No), the transmission information 98*o*1** is not transmitted.

This allows the user to perform the transmission of the transmission information **98*o*1 in the case where the appliance 98*a* is installed, by a simple operation such as an operation of touching the mobile communication device 98*b* to the installed appliance 98*a***.

There is, however, a possibility that the information used by the manufacturer (not shown) of the installed appliance **98*a* or the like after installation is not information available (stored) in the mobile communication device 98*b* such as the phone number of the user of the mobile communication device 98*b* who is also the user of the appliance 98*a*, but information (e.g. the product serial number of the installed appliance 98*a*) not available in the mobile communication device 98*b***.

The information not available in the mobile communication device **98*b* means, for example, information not stored in the mobile communication device 98*b* before the proximity wireless communication 98*c*1** is performed.

There is also a possibility that the use information not available in the mobile communication device **98*b* is the pre-installation known information 98*a*1 specified by the manufacturer or the like upon manufacture of the appliance 98*a* prior to installation, such as the product serial number of the appliance 98*a***.

Accordingly, the installed appliance **98*a* may store the information (pre-installation known information) 98*a*1 such as the product serial number, and transmit the (stored) information 98*a*1 such as the product serial number by the proximity wireless communication 98*c*1 with the mobile communication device 98*b* when the appliance 98*a*** is installed.

In this case, the mobile communication device **98*b* obtains the information (pre-installation known information) 98*a*1 such as the product serial number transmitted by the proximity wireless communication 98*c*1**.

The mobile communication device **98*b* then transmits the transmission information 98*o*1 including the obtained information (pre-installation known information) 98_a_1 such as the product serial number, to the server 98**_c_.

This eliminates the need for the user to input the information (pre-installation known information) 98_a_1 such as the product serial number to the mobile communication device 98_b_, thereby further simplifying the operation.

FIG. 484 is a diagram illustrating appliance information 98_ma_1, type information 98_ma_2, function information 98_ma_3, and so on.

At least a part of the pre-installation known information 98_a_1 may be the appliance information 98_ma_1 (see FIG. 484) for specifying the appliance (the first appliance 98_a_) from among a plurality of appliances (e.g. the first appliance 98_a_ and the second appliance 98_r_ in FIG. 480), such as the product serial number of the appliance, as mentioned earlier.

At least a part of the pre-installation known information 98_a_1 may also be the type information 98_ma_2 for specifying the type of the appliance such as a TV, a refrigerator, or a microwave.

At least a part of the pre-installation known information 98_a_1 may also be the function information 98_ma_3 for specifying a function of the appliance 98_a_.

Examples of the specified function include a display function, a terrestrial digital tuner function, an analog tuner function, and a recording function of a TV and the like.

Examples of the specified function also include a microwave function, a heating function, a cooling function, a function of reading a recording medium recorded according to a predetermined standard (e.g. DVD (Digital Video Disc), Bluray), a function of communicating according to a predetermined method (e.g. Bluetooth, ZigBee, Ethernet), and a function of electric power generation (e.g. solar panel electric power generation).

The function information 98_ma_3 may also be component information for specifying a component (e.g. a display unit such as a liquid crystal display, a terrestrial digital tuner) included in the appliance 98_a_, as the function of the appliance 98_a_.

At least a part of the pre-installation known information 98_a_1 may be attribute information (e.g. the appliance information 98_ma_1, the type by the type information 98_ma_2, the function information 98_ma_3) for indicating an attribute (e.g. the product serial number indicated by the appliance information 98_ma_1, the type indicated by the type information 98_ma_2, the function indicated by the function information 98_ma_3, the component indicated by the component information) of the pre-installation known information 98_a_1.

In recent years, there is a problem of dumping (illegal dumping) of an appliance (e.g. the appliance 98_a_).

There is also demand for a more adequate customer service in accordance with where the appliance is installed, such as a cold area, a hot area, a residential area, a corner area, a slope area, or the like.

Hence, there is a possibility that the use information used by the manufacturer or the like is the position information 98_j_1 (see FIG. 480) indicating the position (e.g. the position of the home of installation) at which the appliance 98_a_ is installed.

Accordingly, the transmission information 98_o_1 including the position information 98_j_1 for specifying the installation position may be transmitted to and stored in the server 98_c_.

This enables the manufacturer or the like to use the position information 98_j_1, by using the transmission information 98_o_1 (the position information 98_j_1) transmitted to the server 98_c_.

Based on the installation position indicated by the position information 98_j_1 in the transmitted transmission information 98_o_1, it is possible to display where the appliance was installed before dumping, or display whether or not the appliance is installed in a slope area.

By such displaying the installation position after the appliance was dumped, the traceability of the appliance can be enhanced.

As described above, the proximity wireless communication 98_c_1 is performed between the installed appliance 98_a_ and the mobile communication device 98_b_. When the proximity wireless communication 98_c_1 is performed, the position of the mobile communication device 98_b_ is the same position (substantially same position, a position near the appliance 98_a_) as the position of the installed appliance 98_a_.

In recent years, a mobile phone (e.g. the mobile communication device 98_b_) is provided with a GPS device to obtain (detect) position information indicating the position of the mobile communication device 98_b_.

Meanwhile, in order to obtain (detect) position information indicating the installation position in the installed appliance 98_a_, it is necessary to provide the appliance 98_a_ with a GPS device for obtaining position information, which causes an increase in cost of the appliance 98_a_.

In view of this, when the proximity wireless communication 98_c_1 is performed and so the position of the installed appliance 98_a_ is the same position as the position of the mobile communication device 98_b_, the position information 98_j_1 indicating the position of the mobile communication device 98_b_ may be obtained (detected) (the position information obtainment unit 98_j_, S973 in FIG. 169).

In this case, the transmission information 98_o_1 further including, as the position information indicating the installation position of the appliance 98_a_, the obtained position information 98_j_1 of the position of the mobile communication device 98_b_ is transmitted.

Since this can be done merely by obtaining the position information 98_j_1 in the mobile communication device 98_b_, a lower cost can be achieved.

Thus, in the case of determining that the proximity wireless communication is performed (S971: Yes), the position information 98_j_1 of the position (the same position as the installation position of the appliance 98_a_) of the mobile communication device 98_b_ at this time is obtained and put to use.

FIG. 481 is a diagram illustrating the position information obtainment unit 98_j_ and the like.

The position information 98_j_1 may be first position information 98_j_1A (FIG. 481) described below.

The first position information 98_j_1A is the position information 98_j_1 that specifies only the position of the home (the first home 99) in which the appliance 98_a_ is installed from among positions of a plurality of homes (e.g. the first home 99, the second home 991 in FIG. 480), and does not specify the installation position (e.g. the position at which the TV N10A is installed as illustrated in FIG. 478) from among a plurality of positions (e.g. the position of the TV N10A, the position of the heater N10K in FIG. 478) in the home in which the appliance 98_a_ is installed.

In other words, the first position information 98_j_1A specifies the position with relatively low (coarse) accuracy, with a relatively small amount of data.

That is, at least a part of the position information obtainment unit 98_j_ may be the GPS device 98_j_1_x_ (see the latitude/longitude positioning unit Y028 in FIG. 440, the GPS N31 in FIG. 445, the position information calculation unit O91 in FIG. 462, etc.) that obtains the second position information 98_j_1A of low accuracy.

For example, the first position information 98_j_1A of low accuracy is home information (see second position information 98_ca_2 in FIG. 483) for specifying the home in which the appliance is installed from among the plurality of homes to thereby specify the position of the home.

FIG. 483 is a diagram illustrating the home ID 98_ca_2 and the like.

In detail, the home information may be the ID (Identifier) 98_ca_2 (FIG. 483) of the specified home, among different IDs (home IDs) of the different homes.

Examples of the home ID 98_ca_2 include a number, a character string, and the like assigned to the home (the first home 99 in which the appliance 98_a_ is installed, among the first home 99 and the second home 991).

In association with this home ID 98_ca_2 (the position information 98_j_1, the first position information) included in the transmission information 98_o_1, a part (e.g. the product serial number 98_cb_ of the TV N10A, the product serial number 98_cb_ of the heater N10K) other than the home ID 98_ca_2 in the transmission information 98_o_1 for each appliance (e.g. the TV N10A, the heater N10K in FIG. 478) installed in the home (the first home 99) specified by the home ID 98_ca_2 may be stored in the server 98_c_.

Such association is designated by the line between the home ID 98_ca_2 and each of the two product serial numbers 989_cb_ in FIG. 483.

FIG. 488 is a diagram illustrating the position information obtainment unit 98_j_ and the like.

The position information 98_j_1 may be second position information 98_j_1B for specifying the installation position (e.g. the position at which the TV N10A is installed as illustrated in FIG. 478) from among the plurality of positions (e.g. the position of the TV N10A, the position of the heater N10K in FIG. 478) in the home (the first home 99) in which the appliance 98_a_ is installed.

In other words, the second position information 98_j_1B may be the position information 98_j_1 that specifies the position with relatively high (fine) accuracy, with a relatively large amount of data.

FIG. 485 is a diagram illustrating a first position 96_d_P, a second position 96_c_P, and the like.

The processor 96_a_ may be provided to process the second position information 98_j_1B (the position information 98_j_1, position information 98_w_ in FIG. 485) included in the transmitted transmission information 98_o_1.

For example, the processor 96_a_ is a wireless communication device such as a wireless LAN access point, which is installed in the home (the first home 99) in which the appliance 98_a_ is installed and performs wireless communication with the installed appliance 98_a_.

The processor 96_a_ may perform the following processing.

FIG. 486 is a flowchart of processing of the transmitted position information 98_j_1B.

The processor 96_a_ obtains the second position information 98_j_1B (the position information 98_j_1, the position information 98_w_ in FIG. 485 included in the transmitted transmission information 98_o_1 (an information obtainment unit 96_a_1, S97_a_ in FIG. 486).

The processor 96_a_ determines whether the position (the installation position of the appliance 98_a_) indicated by the obtained position information 96_j_1B (the position information 98_w_) is the first position 96_c_P (e.g. the position of the heater N10K in FIG. 478) or the second position 96_d_P (e.g. the position of the TV N10A) (a mode selection unit 96_a_2, S97_b_ in FIG. 486).

In the case of determining that the position is the first position 96_c_P (S97_b_: first position), the processor 96_a_ performs first processing (S97_c_1) suitable in the case of the first position 96_c_P. In the case of determining that the position is the second position 96_d_P (S97_b_: second position), the processor 96_a_ performs second processing (S97_c_2) suitable in the case of the second position 96_d_P (a wireless communication unit 96_a_3).

For example, the first-mode wireless communication 96_f_1 (first processing) is suitable as wireless communication with the installed appliance 98_a_, in the case where the appliance 98_a_ is installed at the first position 96_c_P (the position of the heater N10K) (i.e. the installed appliance 98_a_ is the first appliance 96_c_ at the first position 96_c_P).

Meanwhile, the second-mode wireless communication 96_f_2 (second processing) is suitable as wireless communication with the installed appliance 98_a_, in the case where the appliance 98_a_ is installed at the second position 96_d_P (the position of the TV N10A) (i.e. the installed appliance 98_a_ is the second appliance 96_d_ at the second position 96_d_P).

The wireless communication performed here is wireless communication with a wireless communication device (the processor 96_a_ located, for example, at a position 99_c_ in FIG. 478) such as a wireless LAN (Local Area Network) access point which is installed in the home (the first home 99) in which the appliance 98_a_ is installed.

For instance, the first-mode wireless communication 96_f_1 is wireless communication with lower power than a threshold, while the second-mode wireless communication 96_f_2 is wireless communication with higher power than the threshold.

Moreover, for instance, the first position 96_c_P (the position of the heater N10K) for which the low-power wireless communication 96_f_1 is suitable is a position within a distance of a threshold Th (FIG. 485) from the position of the access point or the like (the processor 96_a_), while the second position 96_d_P (the position of the TV N10A) is a position not within the distance of the threshold Th from the position of the access point or the like.

That is, the wireless communication device (the processor 96_a_) may perform the following processing.

From the other device in communication (e.g. the first appliance 96_c_, the second appliance 96_c_) or the like, the wireless communication device obtains appliance information 98_v_ (e.g. the address of the appliance) for specifying the appliance, and also obtains position information 98_s_ (the position information 98_w_) included in the transmitted transmission information (transmission information 98_p_, the transmission information 98_o_1 in FIG. 480) that includes the same appliance information (address, e.g. the appliance information 98_r_ in FIG. 485) as the obtained appliance information 98_v_ (the information obtainment unit 96_a_1, S97_a_).

Based on the obtained position information 98_w_, the wireless communication device performs the processing described above.

As a result, suitable processing (the first wireless communication 96_f_1, the second wireless communication 96_f_2) is performed depending on whether the installation position of the appliance 98_a_ is the first position 96_d_P (the position of the heater N10K) or the second position 96_d_P (the position of the TV N10A). This ensures appropriate processing (wireless communication in an appropriate mode (with appropriate power)), regardless of whether the position is the first position 96_d_P or the second position 96_d_P.

This can be achieved simply by transmitting the transmission information 98_o_1 using the mobile communication device 98_b_ such a mobile phone, with there being no need for the user to install a special device or the like in the home (the first home 99) or perform a complex operation. Hence, appropriate processing can be reliably performed with a simple operation.

Here, the transmission information 98o1 may be transmitted so that suitable processing (the first wireless communication 96f1 or the second wireless communication 96f2) corresponding to the transmitted transmission information 98o1 (the position information) is performed.

In detail, the transmission information 98o1 may be control data for controlling the processor 96a to perform suitable processing (the first wireless communication 96f1 or the second wireless communication 96f2).

The first server 98c (FIG. 485 (FIG. 480)) to which the transmission information 98o1 is transmitted may be a server installed in the home 99, such as a home server (e.g. the server 99a in FIG. 478).

The first server 99a may be connected to the communication line 99b for communicating with outside the home 99 in which the server 99a is situated, as illustrated in FIG. 478.

The first server 98c may also be the above-mentioned wireless communication device (the processor 96a) such as an access point.

Alternatively, the first server 98c to which the transmission information 98o1 is transmitted may be a server of the manufacturer of the appliance 98a outside the home 99, which performs communication via the communication line 99b.

As mentioned earlier, the position information 981j (FIG. 480) may be absolute position information for specifying an absolute position on a map such as a latitude and a longitude as in the case where the GPS device 98j1x (FIG. 481) is used.

That is, the position information obtainment unit 98j (see FIG. 480) may include the GPS device 98j1x, where the position information obtainment unit 98j receives a radio wave (e.g. a radio wave from a GPS satellite) and obtains, from the received radio wave, the position information 98j1 which is absolute position information for indicating a position at which the radio wave is received, as the position of the mobile communication device 98b including the position information obtainment unit 98j.

Thus, the position information obtainment unit may be a GPS device (may include a GPS device), or may be a device that receives a radio wave from a mobile phone base station and obtains, from the received radio wave, absolute position information (the position information 98j1) for specifying a position at which the radio wave is received.

There is, however, a possibility that the use of absolute position information is inadequate.

For example, there is an instance where it is impossible to obtain absolute position information, i.e., it is impossible to obtain absolute position information of sufficiently high accuracy.

When a radio wave received by a device such as a GPS device that uses the received radio wave is not adequate to obtain position information of sufficiently high accuracy, appropriate absolute position information cannot be obtained.

As an example, there is the case where an inadequate radio wave is transmitted and so absolute position information cannot be obtained, when a manufacturer, manager, or the like of the satellite or the base station transmitting the radio wave is different from the manufacturer or the like of the mobile communication device 98b.

Moreover, a GPS device provided in a car navigation device (car navigation) is unable to obtain position information in a tunnel. Thus, there is also the case where absolute position information cannot be obtained because the device is located at a position not suitable for obtaining position information from a radio wave.

In view of this, a position of a base point may be used so that whether the installation position is the first position or the second position is specified based on a difference from the position of the base point to the installation position, such as a distance, a direction (vector), or the like from the base point position (e.g. the base point 98bx in FIG. 485, the position of the access point 99c in FIG. 478) to the installation position (e.g. the position of the heater N10K, the position of the TV N10A) of the appliance 98a.

An example of such a base point position is the position of the access point (e.g. the position of the processor 96a in FIG. 485, the position of the access point 99c in FIG. 478) described above.

In this case, the obtained position information 98j1 may be relative position information for specifying the difference (e.g. a direction, a distance, a vector) from the position of the base point (the base point 98bx) to the position of the mobile communication device 98b (when the proximity wireless communication 98c1 is performed), to thereby specify a position away from the position of the base point (the base point 98bx) by the specified difference, as the installation position of the appliance 98a.

Such relative position information is information from which alone it is impossible to specify absolute position information such as the latitude and the longitude of the installation position of the appliance 98a.

That is, the relative position information may be information that only indicates absolute position information of the installation position of the appliance 98a, as absolute position information of the position away from the position of the base point by the difference specified by the relative position information based on a plurality of pieces of information such as the relative position information and the position of the base point.

In recent years, a communication device such as a smartphone is known to be provided with an acceleration sensor for detecting an acceleration of movement of the communication device.

For example, the acceleration sensor is a sensor for displaying, as a screen (e.g. a screen including characters) displayed by the mobile communication device 98b, an appropriate screen corresponding to a direction (vertical or horizontal) of the communication device after the movement of the detected acceleration, from among a vertical-direction (character) screen and a horizontal-direction (character) screen.

The acceleration sensor in recent years is capable of detecting an acceleration of (significantly) high accuracy, unlike its preceding acceleration sensor.

The detection accuracy is expected to be further increased in the near future.

In view of this, the position information obtainment unit 98j may include the acceleration sensor 98j2x (see the position correction unit Y030 in FIG. 440, the 6-axis sensor N32 in FIG. 445, the acceleration sensor O98 in FIG. 462) that is provided in the mobile communication device 98b to detect an acceleration of movement of the mobile communication device 98b, and utilize the detected acceleration.

In detail, when the user operates to move the mobile communication device 98b from the base point (e.g. the base point 98bx in FIG. 485, the position of the access point 99c in FIG. 478) to the installation position of the appliance 98a (e.g. the heater N10K, the TV N10A), an acceleration of the movement is detected to thereby obtain (calculate) position information (relative position information) indicating the position (e.g. the position of the heater N10K, the position of the TV N10A) of the mobile communication device 98b.

Note that the position prior to this movement is, for example, the position of the base point (the base point 98*bx*) mentioned above.

The transmission information 98*o*1 including the position information 98*j*1 which is the relative position information obtained based on the detected acceleration of the movement in this way is then transmitted to the server 98*c*.

For instance, in the case where the position information 98*j*1 which is the relative position information obtained based on the detected acceleration indicates the movement of the mobile communication device 98*b* (the difference (e.g. distance, direction) from the position of the base point to the position after the movement (e.g. the position of the heater N10K)) from the base point (the base point 98*bx* in FIG. 485, the access point 99*c* in FIG. 478) to the first position 96*c*P (e.g. the position of the heater N10K), the installation position of the appliance 98*a* is determined as the first position 96*c*P (the position of the heater N10K) (S97*b* in FIG. 486: first position).

On the other hand, in the case where the position information 98*j*1 indicates the movement to the second position 96*d*P (the position of the TV N10A), the installation position of the appliance 98*a* is determined as the second position 96*d*P (S97*b*: second position).

This ensures that suitable processing is performed even when the received radio wave of GPS or the like is inadequate and so absolute position information (appropriate absolute position information (e.g. absolute position information of appropriate accuracy)) cannot be obtained.

FIG. 487 is a diagram illustrating position information and the like.

As illustrated in FIG. 487, the obtained position information 98*j*1 (FIG. 487) may include both relative position information 96*q*2 indicating a difference (movement of the mobile communication device 98*b*) 98*b*D from a position 98*b*P of the base point 98*bx* (FIG. 487) as obtained using the acceleration sensor 98*j*2*x*, and absolute position information 96*g*1 of the position 98*b*P of the base point 98*bx*.

Here, for example, the first-mode wireless communication (S97*c*1 in FIG. 486) is a mode of indirectly communicating with another device via a relay device such as a wireless LAN access point, whereas the second-mode wireless communication (S97*c*2 in FIG. 486) is a mode of direct communication without relay, such as ad hoc communication or Wi-Fi (Wireless Fidelity) direct communication.

This being so, the first position 96*c*P may be a position (e.g. the position of the BD recorder N10B) at a distance relatively near a wireless communication device (e.g. the TV N10A) which is the device in communication with the installed appliance 98*a*, i.e., a position where direct communication is preferable as higher communication quality than a threshold is attained.

Meanwhile, the second position 96*d*P may be a position (e.g. the position of the heater N10K, the position of the TV N10I) at a distance relatively far from the wireless communication device (e.g. the TV N10A) which is the device in communication, i.e., a position where relay communication is preferable as direct communication results in low quality.

In detail, the first position 96*c*P where direct communication is preferable may be a position (the position of the BD recorder N10B) in the same room (the room with the TV N10A) as the position of the wireless communication device which is the device in communication.

As an example, when the wireless communication device (the TV N10A) which is the device in communication is a device (the TV N10A) out of a TV and a blue-ray recorder or the like installed in the same room as the TV, the first position 96*c*P (the position of the BD recorder N10B) is the position (the position of the BD recorder N10B), in the same room as the device (the TV N10A), of the other installed appliance 98*a* (the BD recorder N10B).

Meanwhile, the second position 96*d*P (e.g. the position of the TV N10I) where relay communication is preferable may be a position in a room (the room with the TV N10I) different from the wireless communication device (the TV N10A) which is the device in communication, or a position on a floor (the second floor on which the TV N10I is situated) different from a floor (the first floor) on which the wireless communication device (the TV N10A) is situated.

FIG. 489 is a diagram illustrating a remote controller 98I and the like.

For example, among a plurality of appliances (e.g. a first appliance 98*jx* and a second appliance 98*kx* (such as the TV N10A and the heater N10K in FIG. 478)), the user's operation on the remote controller 98I is performed only on an appliance (the first appliance 98*jx*) at a position (e.g. a position 98*j*P of the first appliance 98*jx* (the TV N10A)) in a direction 98I1 of the remote controller 98I, and not on an appliance (the second appliance 98*kx*) at a position (e.g. a position 98*k*P of the second appliance 98*kx* (the heater N10K)) not in the direction 98I1.

However, there is the case where a signal outputted from the remote controller 98I to instruct the operation is a signal by an omnidirectional communication medium, such as a radio signal.

In detail, the remote controller 98I may be the above-mentioned mobile communication device 98*b* such as a mobile phone.

This can cause a situation where the signal also reaches the appliance (the second appliance 98*kx*, the heater N10K) not at the position (the position 98*j*P, the position of the TV N10A) in the direction 98I1, as a result of which the operation of the remote controller 98I is wrongly performed on the appliance (the second appliance 98*kx*, the heater M10K).

In view of this, determination may be made as to whether the position specified by the position information 98*mb* (FIG. 484) included in the transmission information 98*o*1 transmitted for the installed appliance 98*a* (e.g. the first appliance 98*jx*, the second appliance 98*kx*) is the first position (the position jP, the position of the TV N10A) which is a position in the direction 98I1 of the remote controller 98I (S97*b* in FIG. 486: first position) or the second position (the position 98*k*P, the position of the heater N10K) which is not the position 98*j*P in the direction 98I1 (S97*b*: second position) (a determination unit 98*i*1 in FIG. 489).

In the case of determining that the position is the first position (S97*b*: first position), the determined appliance (the first appliance 98*jx*, the TV N10A) is controlled to perform the operation (e.g. channel switch, power-off) (first processing, S97*c*1).

In the case of determining that the position is the second position (the position of the heater N10K) (S97*b*: second position), the determined appliance is not controlled to perform the operation, and second processing (S97*c*2) which is other processing is performed (an operation control unit 96*i*2 in FIG. 489).

Note that one or both (a control device 96*i*) of the determination unit 96*i*1 and the operation control unit 96*i*2 may be a functional block included in the above-mentioned home server (e.g. the server 99*a* in FIG. 478) provided in the home 99.

The first position information of low accuracy (e.g. the home ID 98*ca*2 in FIG. 483) may be an address or a phone number of the home 99 of installation, a product serial number of a mobile phone (e.g. the mobile communication device **98*b*) of a resident of the home 99**, or a name of the resident.

The server **98*c* may receive the transmission information 98*o*1, and specify, from among a plurality of homes (e.g. the first home 99, the second home 991 in FIG. 480), the home (home ID) at the position indicated by the transmission information 98*o*1, as the home (home ID, e.g. the home ID of the first home 99) in which the appliance 98*a*** is installed.

The same mobile communication device **98*b* may transmit the first transmission information 98*o*1 of the first appliance 98*a* when touching the installed first appliance 98*a* (e.g. the TV N10A in FIG. 478), and also transmit the transmission information 98*o*1 of the second appliance 98*a* when touching the installed second appliance 98*a* (e.g. the heater N10**K).

Alternatively, the second mobile communication device **98*b* (of a user in the home 99 other than the user of the first mobile communication device 98*b*) other than the above-mentioned first mobile communication device 98*b* may transmit the second transmission information 98*o*1 of the second appliance 98*a* when touching the installed second appliance 98*a***.

The second transmission information **98*o*1 transmitted here may include the same information (e.g. the ID of the home 99) as the first transmission information 98*o*1**.

The second transmission information **98*o*1 may include the above information included in the first transmission information 98*o*1, which is obtained by the second mobile communication device 98*b* from the server such as the home server (e.g. the server 99*a* in FIG. 478**) that stores the information.

The stored information may be information transmitted from the first mobile communication device **98*b* to the server. As an alternative, the information included in the first transmission information 98*o*1 may be information which the first mobile communication device 98*b*** receives from the server.

The specific information for specifying the device (e.g. the mobile communication device **98*b*, the installed appliance 98*a***) may be the product serial number of the device as mentioned above, or a MAC (Media Access Control) address of the device.

The ID of the home 99 in which the appliance **98*a* is installed may be information that specifies, by such a product serial number, the home (the home 99) of the resident having the device (e.g. the mobile communication device 98*b***) of the product serial number, from among a plurality of homes.

The product serial number or the like used as the ID of the home may be a product serial number of an appliance corresponding to first transmission of transmission information among a plurality of appliances (see the appliances in FIG. 478) installed in the home.

[Embodiment C]

Embodiment C of the present invention describes a position detection device that is capable of detecting a proper position with a simple structure and process at reduced cost.

The following describes Embodiment C of the present invention with reference to drawings.

FIG. 491 is a functional block diagram of a position detection device according to Embodiment C of the present invention. A position detection device 100 is fixed to a mobile terminal, and detects a position of the position detection device 100 as a position of the mobile terminal. As shown in FIG. 491, the position detection device 100 includes an acceleration sensor 101, an angular velocity sensor 102, a geomagnetic sensor 103, a movement amount detection unit 104, a terminal posture detection unit 105, a geomagnetic noise detection unit 106, a coordinate estimation unit 107, a geomagnetic noise pattern management unit 108, a geomagnetic noise pattern storage unit 109, and a coordinate correction unit 110. Since the position detection device 100 is fixed to the mobile terminal, the states of the mobile terminal such as position, orientation, tilt, acceleration, acceleration direction, movement direction, movement distance, rotation direction, angular velocity, and the like are the same as the states of the position detection device 100.

The acceleration sensor 101 detects a direction and a magnitude of a force such as gravity and inertial force acting on the acceleration sensor 101, in a local coordinate system (three-axis coordinate system of X, Y, and Z axes) fixed to the position detection device 100. For example, in the case where the position detection device 100 or the mobile terminal is shaped long in one direction, the longitudinal direction of the position detection device 100 or the mobile terminal is the Z-axis direction, and the directions perpendicular to the Z axis and orthogonal to each other are the X-axis direction and the Y-axis direction. The acceleration sensor 101 performs the above-mentioned detection and outputs acceleration information indicating the detection result, at predetermined time intervals.

The angular velocity sensor 102 detects a rotation direction and an angular velocity of the mobile terminal, at predetermined time intervals.

The geomagnetic sensor 103 detects a magnetic field strength in the local coordinate system, at predetermined time intervals. In detail, the geomagnetic sensor 103 detects a magnetic field strength in each of the X-axis direction, the Y-axis direction, and the Z-axis direction. A magnetic field (geomagnetism) in the position of the mobile terminal is expressed as one magnetic field vector, based on these magnetic field strengths of the three axes.

The terminal posture detection unit 105 calculates (detects), at predetermined time intervals, a posture of the mobile terminal with respect to the earth, based on the detection results of the acceleration sensor 101, the angular velocity sensor 102, and the geomagnetic sensor 103. The posture includes a tilt of the mobile terminal with respect to a horizontal plane and an orientation of the mobile terminal on the horizontal plane.

The movement amount detection unit 104 calculates (detects), at predetermined time intervals, a movement direction, a movement velocity, and a movement distance of the mobile terminal in a global coordinate system fixed to the earth or a home coordinate system fixed to the inside of the home, based on the posture calculated by the terminal posture detection unit 105 and the acceleration information outputted from the acceleration sensor 101. A parameter indicating the movement direction and the movement distance is referred to as a movement amount.

The geomagnetic noise detection unit 106 determines (detects), at predetermined time intervals, whether or not an abnormality occurs in geomagnetic detection, i.e. whether or not geomagnetic noise occurs, based on the detection result of the angular velocity sensor 102 and the magnetic field strength detected by the geomagnetic sensor 103. In the case of determining that geomagnetic noise occurs, the geomagnetic noise detection unit 106 outputs a geomagnetic noise pattern representing time-series change of geomagnetic noise (magnetic field strength detected by the geomagnetic sensor 103) to the geomagnetic noise pattern management unit 108 as an occurring geomagnetic noise pattern, during the time when geomagnetic noise occurs.

The coordinate estimation unit 107 calculates (estimates) a current position of the position detection device 100 as estimated current position coordinates, based on immediately previously calculated coordinates and the movement amount calculated by the movement amount detection unit 104. The estimated current position coordinates are used as the immediately previously calculated coordinates when calculating the next estimated current position coordinates. The immediately previously calculated coordinates are hereafter referred to as previously estimated coordinates.

The coordinate estimation unit 107 further calculates accuracy of the estimated current position coordinates as estimated current position accuracy, based on at least one of: a distance between a previously recognized reference point (described later) and the estimated current position coordinates; complexity of movement such as curb and tilt between the previously recognized reference point and the estimated current position coordinates; and a time period of movement between the previously recognized reference point and the estimated current position coordinates. The coordinate estimation unit 107 outputs the estimated current position coordinates and the estimated current position accuracy, to the geomagnetic noise pattern management unit 108. For example, the coordinate estimation unit 107 calculates the estimated current position coordinates and the estimated current position accuracy and outputs them to the geomagnetic noise pattern management unit 108 and also outputs the estimated current position coordinates to the coordinate correction unit 110, at predetermined time intervals.

The geomagnetic noise pattern storage unit 109 is a recording medium in which a table indicating, for each reference point, a geomagnetic noise pattern in the reference point (hereafter referred to as a reference noise pattern), coordinates of the reference point (hereafter referred to as reference coordinates), and accuracy of the coordinates of the reference point (hereafter referred to as reference accuracy) in association with each other is stored. The reference point mentioned here is a position, in the global coordinate system or the home coordinate system, which serves as a reference for correcting the estimated current position coordinates.

The geomagnetic noise pattern management unit 108 obtains the occurring geomagnetic noise pattern from the geomagnetic noise detection unit 106. The geomagnetic noise pattern management unit 108 also obtains, from the coordinate estimation unit 107, the estimated current position coordinates and the estimated current position accuracy calculated by the coordinate estimation unit 107 at the time when the occurring geomagnetic noise pattern is obtained, i.e. when geomagnetic noise occurs. The geomagnetic noise pattern management unit 108 determines whether or not to correct the estimated current position coordinates, based on the obtained occurring geomagnetic noise pattern, estimated current position coordinates, and estimated current position accuracy and the table in the geomagnetic noise pattern storage unit 109. The estimated current position coordinates the correction of which is determined are estimated current position coordinates to be processed (processing-target estimated current position coordinates), are calculated by the coordinate estimation unit 107 at the time when geomagnetic noise occurs, and represent the position of the position detection device 100 at the time of detecting the geomagnetic noise occurrence.

In the case of determining to correct the estimated current position coordinates, the geomagnetic noise pattern management unit 108 instructs the coordinate correction unit 110 to correct the estimated current position coordinates. The geomagnetic noise pattern management unit 108 also updates the table in the geomagnetic noise pattern storage unit 109 according to need.

The coordinate correction unit 110 obtains the estimated current position coordinates from the coordinate estimation unit 107, and outputs the estimated current position coordinates. In the case of receiving the instruction to correct the estimated current position coordinates from the geomagnetic noise pattern management unit 108, the coordinate correction unit 110 obtains reference coordinates which are corrected coordinates, from the geomagnetic noise pattern management unit 108. The coordinate correction unit 110 then replaces the estimated current position coordinates with the reference coordinates, and outputs the reference coordinates as corrected estimated current position coordinates.

FIG. 492 is a diagram showing the table in the geomagnetic noise pattern storage unit 109.

A table 109*a* indicates, for each reference point, a reference point ID for identifying the reference point, a reference noise pattern in the reference point, reference coordinates of the reference point, reference accuracy of the reference point, and an update time of the reference point in association with each other, as mentioned above. For example, in the table 109*a*, a reference noise pattern "reference noise pattern 1", reference coordinates "(X2, Y2, Z2)", reference accuracy "60%", and an update time "20000202:22:10:05" are associated with a reference point ID "p1".

The position detection device 100 having the above structure detects (estimates) the position of the position detection device 100 in real time by autonomous navigation using the detection results of the acceleration sensor 101, the angular velocity sensor 102, and the geomagnetic sensor 103, and appropriately corrects the detected position based on geomagnetic noise.

FIG. 493 is a diagram showing an example of geomagnetic noise occurrence areas in the home. As shown in FIG. 493, a mobile terminal 1000 including the position detection device 100 moves from a start reference point p0 which is an entrance, in the home (indoor). The mobile terminal 1000 passes near a refrigerator which is a geomagnetic noise occurrence area A. At this time, the position detection device 100 in the mobile terminal 1000 determines that geomagnetic noise occurs due to magnetism generated by the refrigerator or a metal plate of the refrigerator. That is, the geomagnetic sensor 103 in the position detection device 100 detects a magnetic field different from a magnetic field that is logically detected due to geomagnetism. For instance, the position detection device 100 may determine a situation where a completely different magnetic field strength from the natural world is observed, as an occurrence of an abnormality. Likewise, when the mobile terminal 1000 passes near a steel structure at the bottom of a staircase which is a geomagnetic noise occurrence area B, the position detection device 100 determines that geomagnetic noise occurs due to an influence of the steel structure. Further, when the mobile terminal 1000 goes upstairs and passes near a steel structure of the second floor which is a geomagnetic noise occurrence area C, the position detection device 100 determines that geomagnetic noise occurs due to an influence of the steel structure.

In these geomagnetic noise occurrence areas, the geomagnetism (magnetic field) is disturbed by electrical equipment, structures, and the like in the home or indoors. Such geomagnetic noise occurrence areas A and B are identified respectively by the reference point IDs "p1" and "p2" in the table 109*a* in the geomagnetic noise pattern storage unit 109.

FIG. 494 is a diagram showing an example of an occurring geomagnetic noise pattern.

As shown in FIG. 494, the geomagnetic sensor 103 detects a magnetic field strength in each of the X-axis direction, the Y-axis direction, and the Z-axis direction, at predetermined time intervals (e.g. 10 ms). When the mobile terminal 1000 moves and passes a geomagnetic noise occurrence area such as near the refrigerator mentioned above, the magnetic field strength in each of the X-axis direction, the Y-axis direction, and the Z-axis direction detected by the geomagnetic sensor 103 changes in a manner different from an assumed magnetic field strength by geomagnetism. For example, in the case where the mobile terminal 1000 is present in the geomagnetic noise occurrence area in a time period from time t1 to time t2 during movement, the geomagnetic sensor 103 detects a magnetic field strength different from the assumed magnetic field strength by geomagnetism in each of the three axial directions, in the time period.

The geomagnetic noise detection unit 106 determines that geomagnetic noise occurs in such a time period. The geomagnetic noise detection unit 106 then outputs a pattern (geomagnetic noise pattern) representing the temporal change of the magnetic field strength in each of the X-axis direction, the Y-axis direction, and the Z-axis direction in the time period, to the geomagnetic noise pattern management unit 108 as the occurring geomagnetic noise pattern. There is a high possibility that the occurring geomagnetic noise pattern repeats each time the mobile terminal 1000 passes the same geomagnetic noise occurrence area.

FIG. 495 is a flowchart showing flow of a process relating to coordinate estimation by the position detection device 100 according to this embodiment.

First, the terminal posture detection unit 105 calculates the posture of the mobile terminal 1000 based on the detection results of the acceleration sensor 101, the angular velocity sensor 102, and the geomagnetic sensor 103 (Step S101).

Next, the movement amount detection unit 104 obtains acceleration information outputted from the acceleration sensor 101 from when the previously estimated coordinates are calculated by the coordinate estimation unit 107 (Step S102). Here, if the previously estimated coordinates are not calculated yet, the movement amount detection unit 104 may obtain acceleration information outputted from when the mobile terminal 1000 passes a preset reference point such as the entrance. In the case where the position detection device 100 has a GPS function, the movement amount detection unit 104 may obtain acceleration information outputted from the last time the coordinates (the position of the position detection device 100) are calculated by the GPS function. The movement amount detection unit 104 obtains terminal posture information indicating the posture calculated by the terminal posture detection unit 105, from the terminal posture detection unit 105 (Step S103). The movement amount detection unit 104 calculates the movement direction and the movement distance of the mobile terminal 1000, based on the terminal posture information and the acceleration information (Step S104).

Next, the coordinate estimation unit 107 calculates the position away from the previously estimated coordinates in the movement direction calculated by the movement amount detection unit 104 by the movement distance calculated by the movement amount detection unit 104, as the estimated current position coordinates (Step S105). The coordinate estimation unit 107 also calculates the estimated current position accuracy according to the distance between the previously recognized reference point and the estimated current position coordinates (Step S106). Note that the previously recognized reference point is the position of the mobile terminal 1000 at the time of immediately previous determination by the geomagnetic noise detection unit 106 that geomagnetic noise occurs. That is, the coordinate estimation unit 107 sets the estimated current position accuracy, from a total amount of movement from the time of previous reference point recognition. For example, the coordinate estimation unit 107 calculates lower estimated current position accuracy when the estimated current position coordinates are farther from the previously recognized reference point. The estimated current position accuracy may be calculated by taking into consideration only one or all of the movement distance from the previous reference point, the complexity of movement from the previous reference point due to the amount of curb, tilt, and the like during movement, and the time period of movement from the previous reference point.

FIG. 496 is a flowchart showing flow of a process by the terminal posture detection unit 105.

First, the terminal posture detection unit 105 obtains acceleration information from the acceleration sensor 101, and calculates the gravity direction (vertical direction) in the local coordinate system based on the acceleration information (Step S201). For example, the terminal posture detection unit 105 calculates the direction of the vertical force corresponding to gravity, based on the logically derived value of gravity and the direction and magnitude of the force in the local coordinate system indicated by the acceleration information.

Next, the terminal posture detection unit 105 calculates the tilt of the mobile terminal 1000 with respect to the horizontal plane, based on the tilt of the gravity direction with respect to the X, Y, and Y axes in the local coordinate system (Step S203).

The terminal posture detection unit 105 also inquires of the geomagnetic noise detection unit 106 about geomagnetic noise occurrence (Step S203), to determine whether or not geomagnetic noise occurs (Step S204).

In the case of determining that geomagnetic noise does not occur (Step S204: No), the terminal posture detection unit 105 obtains the detection result of the geomagnetic sensor 103, and calculates the orientation of the mobile terminal 1000 on the horizontal plane based on the obtained detection result and the tilt calculated in Step S202 (Step S205). In the case of determining that geomagnetic noise occurs (Step S204: Yes), on the other hand, the terminal posture detection unit 105 obtains the detection result of the angular velocity sensor 102, and calculates the orientation of the mobile terminal 1000 on the horizontal plane based on the obtained detection result and the tilt calculated in Step S202 (Step S206). In this case, the terminal posture detection unit 105 specifies an orientation change on the horizontal plane, based on the rotation direction and the angular velocity detected by the angular velocity sensor 102 from the time of immediately previous calculation of the orientation of the mobile terminal 1000 on the horizontal plane. The terminal posture detection unit 105 adds the specified orientation change to the immediately previously calculated orientation on the horizontal plane, thereby calculating the current orientation of the mobile terminal 1000 on the horizontal plane. Note that, in the case of determining that geomagnetic noise does not occur in Step S204 (Step S204: No), the terminal posture detection unit 105 may calculate the orientation of the mobile terminal 1000 on the horizontal plane more accurately based on the detection results of both the geomagnetic sensor 103 and the angular velocity sensor 102.

By the process described above, the terminal posture detection unit 105 detects the posture of the mobile terminal 1000.

FIG. 497 is a flowchart showing flow of a process by the geomagnetic noise detection unit 106.

The geomagnetic noise detection unit 106 obtains the detection result (the magnetic field strength in each of the X-axis direction, the Y-axis direction, and the Z-axis direction) of the geomagnetic sensor 103, from the geomagnetic sensor 103 (Step S301). The geomagnetic noise detection unit 106 then determines whether or not there is a difference of at least a predetermined magnitude or ratio between a magnitude of a magnetic field vector represented by the magnetic field strength in each of the X-axis direction, the Y-axis direction, and the Z-axis direction and a logical geomagnetic magnitude (strength) (Step S302).

The logical geomagnetic magnitude (strength) mentioned here is a predetermined strength. The geomagnetic noise detection unit 106 may change the logical geomagnetic magnitude depending on the position of the position detection device 100. In such a case, the geomagnetic noise detection unit 106 uses a database indicating, for each position on the earth, the logical geomagnetic magnitude in the position. For example, in the case where the position detection device 100 has a GPS function, the geomagnetic noise detection unit 106 predicts the current position of the position detection device 100 on the earth based on the coordinates (the position of the position detection device 100) last calculated by the GPS function, and selects the logical geomagnetic magnitude in the predicted position from the database. Here, the geomagnetic noise detection unit 106 may predict the current position on the earth, as the coordinates last calculated by the GPS function. Alternatively, the geomagnetic noise detection unit 106 may receive input of the position on the earth from the user, and select the geomagnetic magnitude in the position from the database.

In the case of determining that there is the difference (Step S302: Yes), the geomagnetic noise detection unit 106 determines that geomagnetic noise occurs. The geomagnetic noise detection unit 106 accordingly outputs three-axis magnetic field strength information indicating the magnetic field strength in each of the X-axis direction, the Y-axis direction, and the Z-axis direction, to the geomagnetic noise pattern management unit 108 (Step S305).

In the case of determining that there is not the difference (Step S202: No), on the other hand, the geomagnetic noise detection unit 106 calculates an orientation change amount of the mobile terminal 1000 on the horizontal plane in a predetermined time period, based on the detection result of the angular velocity sensor 102 (Step S303). Following this, the geomagnetic noise detection unit 106 determines whether or not there is a difference of at least a predetermined amount or ratio between an orientation change amount of the mobile terminal 1000 derived from a change in magnetic field strength in each of the X-axis direction, the Y-axis direction, and the Z-axis direction in the predetermined time period and the orientation change amount calculated in Step S303 (Step S304). That is, the geomagnetic noise detection unit 106 detects whether or not an abnormality occurs in geomagnetic detection, by comparing the orientation change amount of the position detection device 100 detected by the angular velocity sensor 102 and the orientation change amount of the mobile terminal 1000 derived from the change in magnetic field strength in each of the three axial directions detected by the geomagnetic sensor 103.

In the case of determining that there is the difference (Step S304: Yes), the geomagnetic noise detection unit 106 determines that geomagnetic noise (abnormality) occurs. The geomagnetic noise detection unit 106 accordingly outputs the three-axis magnetic field strength information indicating the magnetic field strength in each of the X-axis direction, the Y-axis direction, and the Z-axis direction, to the geomagnetic noise pattern management unit 108 (Step S305).

In the case of determining that there is not the difference (Step S304: No), on the other hand, the geomagnetic noise detection unit 106 detects that geomagnetic noise (abnormality) does not occur.

The geomagnetic noise detection unit 106 repeatedly performs the process of Steps S301 to S305 at predetermined time intervals (e.g. 10 ms). Hence, the geomagnetic noise detection unit 106 repeatedly performs Step S305, for example in a time period from time t2 to time t3 shown in FIG. 493. By sequentially outputting the three-axis magnetic field strength information in the time period, the geomagnetic noise detection unit 106 outputs, to the geomagnetic noise pattern management unit 108, the occurring geomagnetic noise pattern representing the time-series change of the magnetic field strength in each of the X-axis direction, the Y-axis direction, and the Z-axis direction.

When outputting the three-axis magnetic field strength information to the geomagnetic noise pattern management unit 108, the geomagnetic noise detection unit 106 corrects the magnetic field strength in each of the X-axis direction, the Y-axis direction, and the Z-axis direction indicated by the three-axis magnetic field strength information to a magnetic field strength in a predetermined basic posture, based on the posture calculated by the terminal posture detection unit 105. The geomagnetic noise detection unit 106 then outputs the three-axis magnetic field strength information indicating the corrected magnetic field strength, to the geomagnetic noise pattern management unit 108.

Thus, in this embodiment, in the case where there is the difference of at least the predetermined amount or ratio between the orientation change amount of the mobile terminal 1000 (position detection device 100) detected by the angular velocity sensor 102 and the orientation change amount of the mobile terminal 1000 derived from the change in magnetic field strength in each of the three axial directions detected by the geomagnetic sensor 103, the geomagnetic noise detection unit 106 detects that an abnormality occurs in geomagnetic detection.

Typically, when a magnetic field strength different from a magnetic field strength logically derived according to a latitude and a longitude of a specific position or location is detected, an occurrence of an abnormality in geomagnetic detection in the specific position or location is detected. Conversely, when a magnetic field strength substantially equal to the logically-derived magnetic field strength is detected, no occurrence of an abnormality in geomagnetic detection in the specific position or location is detected. However, there is a special case where, even if a magnetic field unrelated to geomagnetism is present near the position detection device 100, a magnetic field strength substantially equal to the logically-derived magnetic field strength is detected as a result of a change in orientation of the position detection device 100. In such a special case, an occurrence of an abnormality in geomagnetic detection should actually be detected. In view of this, the orientation change amount of the position detection device 100 detected by the angular velocity sensor 102 and the orientation change amount of the position detection device 100 derived from the change in magnetic field strength detected by the geomagnetic sensor 103 are compared with each other. By doing so, an occurrence of an abnormality in geomagnetic detection can be appropriately detected in the above-mentioned special case. In detail, in the above-mentioned special case, the orientation change amount of the position detection device 100 detected by the angular velocity sensor 102 and the orientation change amount of the position detection device 100 derived from the change in magnetic field strength detected by the geomagnetic sensor 103 are different. Accordingly, an occurrence of an abnormality in geomagnetic detection can be detected when the difference between these orientation change amounts is equal to or more than the predetermined amount or ratio.

Moreover, the process of Steps S303 and S304 can prevent false detection in determining whether or not geomagnetic noise occurs, i.e. whether or not an abnormality occurs in geomagnetic detection. There is a case where the magnetic field strength (magnetic field strength in each of the X-axis direction, the Y-axis direction, and the Z-axis direction) detected by the geomagnetic sensor 103 changes according to a change in orientation of the position detection device 100. It is, however, possible to prevent wrong determination that an abnormality occurs in geomagnetic detection due to a change in magnetic field strength, in such a case.

FIG. 498 is a flowchart showing flow of a process by the geomagnetic noise pattern management unit 108.

First, the geomagnetic noise pattern management unit 108 obtains, from the coordinate estimation unit 107, the estimated current position coordinates (processing-target estimated current position coordinates) and the estimated current position accuracy calculated by the coordinate estimation unit 107 at the time when the occurring geomagnetic noise pattern is obtained from the geomagnetic noise detection unit 106, i.e. when geomagnetic noise occurs (Step S401). The geomagnetic noise pattern management unit 108 also references to the table 109*a* in the geomagnetic noise pattern storage unit 109, and searches in the table 109*a* for a reference noise pattern similar to the occurring geomagnetic noise pattern, as a similar reference noise pattern (Step S402).

When one or more similar reference noise patterns are found in Step S402, the geomagnetic noise pattern management unit 108 further searches the one or more similar reference noise patterns for a similar reference noise pattern that is associated with reference coordinates close to the estimated current position coordinates in the table 109*a* and has high similarity to the occurring geomagnetic noise pattern, as a corrected reference noise pattern (Step S403). That is, the geomagnetic noise pattern management unit 108 searches for the corrected reference noise pattern which is a pattern associated with the reference coordinates near the processing-target estimated current position coordinates and similar to the occurring geomagnetic noise pattern.

When performing the search in Steps S402 and S403, the geomagnetic noise pattern management unit 108 compares the occurring geomagnetic noise pattern with each reference noise pattern (reference noise pattern to be compared (comparison-target reference noise pattern)). That is, the geomagnetic noise pattern management unit 108 performs pattern matching between the occurring geomagnetic noise pattern and each reference noise pattern. Here, the geomagnetic noise pattern management unit 108 performs scaling on the occurring geomagnetic noise pattern on a time axis beforehand. In detail, the geomagnetic noise pattern management unit 108 obtains the movement velocity of the mobile terminal 1000 at the time when the occurring geomagnetic noise pattern is generated, i.e. when geomagnetic noise occurs, from the movement amount detection unit 104. The geomagnetic noise pattern management unit 108 then scales the occurring geomagnetic noise pattern in the direction of the time axis, according to a ratio between the movement velocity and a predetermined movement velocity (comparative reference velocity). As a result, the scale of the occurring geomagnetic noise pattern on the time axis matches the scale of the comparison-target reference noise pattern on the time axis. After this, the geomagnetic noise pattern management unit 108 compares the scaled occurring geomagnetic noise pattern with the reference noise pattern (pattern matching).

For example, in Steps S402 and S403, the geomagnetic noise pattern management unit 108 calculates, for each reference noise pattern, a sum of: an index value which is larger when the distance between the processing-target estimated current position coordinates and the reference coordinates corresponding to the comparison-target reference noise pattern is smaller; and a similarity level obtained as a result of pattern matching between the occurring geomagnetic noise pattern and the comparison-target reference noise pattern. The geomagnetic noise pattern management unit 108 selects a reference noise pattern corresponding to a sum that is largest of the calculated sums and is more than a predetermined threshold, as the corrected reference noise pattern.

The geomagnetic noise pattern management unit 108 determines whether or not the corrected reference noise pattern is found as a result of the search in Step S403 (Step S404).

In the case of determining that the corrected reference noise pattern is found (Step S404: Yes), the geomagnetic noise pattern management unit 108 further determines whether or not the reference accuracy associated with the corrected reference noise pattern in the table 109*a* is higher than the estimated current position accuracy obtained in Step S401 (Step S405).

In the case of determining that the reference accuracy is higher than the estimated current position accuracy in Step S405 (Step S405: Yes), the geomagnetic noise pattern management unit 108 instructs the coordinate correction unit 110 to correct the estimated current position coordinates by replacing the estimated current position coordinates with the reference coordinates associated with the corrected reference noise pattern in the table 109*a* (Step S406). The coordinate correction unit 110 obtains the reference coordinates from the geomagnetic noise pattern management unit 108. The coordinate correction unit 110 then replaces the estimated current position coordinates obtained from the coordinate estimation unit 107 with the reference coordinates to correct the estimated current position coordinates, and outputs the corrected estimated current position coordinates (=reference coordinates). The geomagnetic noise pattern management unit 108 notifies the coordinate estimation unit 107 of the reference coordinates associated with the corrected reference noise pattern in the table 109*a*, as the previously recognized reference point.

Thus, when the corrected reference noise pattern is available, the processing-target estimated current position coordinates are corrected in the case where the reference accuracy associated with the corrected reference noise pattern is higher than the estimated current position accuracy. This prevents the estimated current position coordinates from being corrected even in the case where the accuracy of the reference coordinates stored in the geomagnetic noise pattern storage unit 109 in association with the corrected reference noise pattern is equal to or lower than the accuracy of the estimated current position coordinates. Hence, a more proper position can be detected.

In the case of determining that the reference accuracy is equal to or lower than the estimated current position accuracy in Step S405 (Step S405: No), the geomagnetic noise pattern management unit 108 updates the reference coordinates and the reference accuracy associated with the corrected reference noise pattern in the table 109*a* in the geomagnetic noise pattern storage unit 109. In detail, the geomagnetic noise pattern management unit 108 replaces the reference coordinates and the reference accuracy associated with the corrected reference noise pattern, respectively with the estimated current position coordinates and the estimated current position accuracy (Step S407). In this way, the accuracy of the reference coordinates stored in the geomagnetic noise pattern storage unit 109 can be increased. The geomagnetic noise pattern management unit 108 notifies the coordinate estimation unit 107 of the estimated current position coordinates, as the previously recognized reference point.

In the case of determining that the corrected reference noise pattern is not found in Step S408 (Step S404: No), the geomagnetic noise pattern management unit 108 registers the occurring geomagnetic noise pattern, the estimated current position coordinates, and the estimated current position accuracy in the table 109*a* in the geomagnetic noise pattern storage unit 109 in association with each other, respectively as a new reference noise pattern, reference coordinates, and reference accuracy (Step S408). The geomagnetic noise pattern management unit 108 also registers a new reference point ID and update time in the table 109*a*, in association with the new reference noise pattern and the like. The update time is a time at which the registration is performed. Moreover, the newly registered occurring geomagnetic noise pattern is the pattern scaled on the time axis as mentioned above. After Step S408, the geomagnetic noise pattern management unit 108 notifies the coordinate estimation unit 107 of the new reference coordinates as the previously recognized reference point.

FIG. 499 is a flowchart showing a position detection method according to this embodiment.

The position detection method according to this embodiment is a method of detecting the position of the mobile terminal 1000 by estimating the coordinates representing the position of the mobile terminal 1000 after movement. In this position detection method, first the coordinate estimation unit 107 estimates the estimated current position coordinates representing the current position (Step S14). Next, the geomagnetic noise detection unit 106 detects whether or not an abnormality occurs in geomagnetic detection by the geomagnetic sensor 103. The geomagnetic noise detection unit 106 generates the geomagnetic noise pattern (occurring geomagnetic noise pattern) which is a pattern representing the time-series change of the magnetic field strength detected by the geomagnetic sensor 103, during the occurrence of the abnormality (Step S16).

Next, the geomagnetic noise pattern management unit 108 searches one or more patterns (reference noise patterns) stored in the recording medium (geomagnetic noise pattern storage unit 109), for the corrected reference noise pattern which is a pattern associated with coordinates near the processing-target estimated current position coordinates estimated at the time of abnormality occurrence and similar to the geomagnetic noise pattern (Step S18). In the case where the corrected reference noise pattern is not found as a result of the search (Step S18: No), the geomagnetic noise pattern management unit 108 stores the processing-target estimated current position coordinates and the geomagnetic noise pattern in the recording medium in association with each other (Step S20). In the case where the corrected reference noise pattern is found as a result of the search (Step S18: Yes), on the other hand, the geomagnetic noise pattern management unit 108 instructs to correct the processing-target estimated current position coordinates (Step S22). According to the correction instruction, the coordinate correction unit 110 corrects the processing-target estimated current position coordinates to the coordinates (reference coordinates) stored in the recording medium in association with the corrected reference noise pattern (Step S24).

Thus, in this embodiment, the geomagnetic noise pattern is generated during an occurrence of an abnormality in geomagnetic detection by the geomagnetic sensor 103, and the geomagnetic noise pattern storage unit 109 is searched for the corrected reference noise pattern similar to the geomagnetic noise pattern. In the case where the corrected reference noise pattern is found, the processing-target estimated current position coordinates estimated at the time of abnormality occurrence are corrected to the reference coordinates stored in the geomagnetic noise pattern storage unit 109 in association with the corrected reference noise pattern. Since the occurring geomagnetic noise pattern has repeatability, if the reference coordinates are accurate, the processing-target estimated current position coordinates can be corrected to proper coordinates based on the occurring geomagnetic noise pattern. Moreover, the corrected reference noise pattern search is performed for the corrected reference noise pattern which is associated with reference coordinates near the processing-target estimated current position coordinates, so that the processing-target estimated current position coordinates can be prevented from being wrongly corrected to distant coordinates. Here, reference coordinates within a predetermined distance from the processing-target estimated current position coordinates may be treated as reference coordinates near the processing-target estimated current position coordinates.

In this embodiment, the process performed for deriving the proper coordinates after correction is merely the search for the corrected reference noise pattern similar to the occurring geomagnetic noise pattern. That is, the comparison (pattern matching) between the occurring geomagnetic noise pattern and the comparison-target reference noise pattern is conducted. Therefore, in this embodiment, there is no need for a camera required in PTL 1, and image processing for pattern matching between an image captured by the camera and a shape of a ventilation port is unnecessary. As a result, a proper position can be detected with a simple structure and process, contributing to reduced cost.

In this embodiment, in the case where the corrected reference noise pattern is not found, the processing-target estimated current position coordinates and the occurring geomagnetic noise pattern are stored in the geomagnetic noise pattern storage unit 109 in association with each other. This saves the user a trouble of storing the combination of the coordinates and the pattern in the geomagnetic noise pattern storage unit 109, as the database indicating such combinations can be automatically created and developed. Thus, the position detection device 100 provides improved convenience even in an environment, such as inside a home, forming a diverse space depending on user.

In the position detection device 100 in this embodiment, before the estimation of the estimated current position coordinates in Step S14, the terminal posture detection unit 105 detects the posture of the mobile terminal 1000 based on the detection results of the acceleration sensor 101 and the geomagnetic sensor 103. Following this, the movement amount detection unit 104 detects the movement amount indicating the movement direction and the movement distance of the mobile terminal 1000, based on the posture detected by the terminal posture detection unit 105 and the detection result of the acceleration sensor 101. As a result, in Step S14, the coordinate estimation unit 107 estimates the coordinates away from the previously estimated coordinates by the movement amount detected by the movement amount detection unit 104, as the estimated current position coordinates.

Thus, in this embodiment, the estimated current position coordinates are detected as the current position of the mobile terminal 1000 and the position detection device 100, based on the detection results of the acceleration sensor 101, the geomagnetic sensor 103, the terminal posture detection unit 105, and the movement amount detection unit 104. In other words, the current position of the position detection device 100 is detected by autonomous navigation. This allows the current position of the position detection device 100 to be detected accurately, and corrected to a more proper position. Though the current position of the position detection device 100 is detected by autonomous navigation in this embodiment, the current position of the position detection device 100 may be detected or estimated by another method such as a method using GPS.

In this embodiment, the geomagnetic noise pattern is generated by detecting the magnetic field strength at predetermined sampling intervals. In this case, if the movement velocity of the position detection device 100 differs when the position detection device 100 repeatedly passes the same position, the generated geomagnetic noise pattern will end up being different. Accordingly, in this embodiment, the occurring geomagnetic noise pattern is scaled so that the time-axis scale of the occurring geomagnetic noise pattern matches the time-axis scale of the comparison-target reference noise pattern stored in the geomagnetic noise pattern storage unit 109. This makes it possible to search for the appropriate corrected reference noise pattern. In the case where the corrected reference noise pattern is not found, the geomagnetic noise pattern scaled based on the predetermined movement velocity (comparative reference velocity) is stored in the recording medium. Since there is no need to store the movement velocity detected at the time of abnormality occurrence in the geomagnetic noise pattern storage unit 109, the storage capacity of the geomagnetic noise pattern storage unit 109 can be saved.

(Variation 1)

Variation 1 of this embodiment is described below. The geomagnetic noise pattern management unit 108 according to this variation is characterized in that the movement velocity of the mobile terminal 1000 is also stored in the table in the geomagnetic noise pattern storage unit 109.

FIG. 500 is a diagram showing the table in the geomagnetic noise pattern storage unit 109 according to this variation.

A table 109*b* indicates, for each reference point, a reference point ID for identifying the reference point, a reference noise pattern in the reference point, reference coordinates of the reference point, reference accuracy of the reference point, movement velocity of the mobile terminal 1000 when passing the reference point, and an update time of the reference point in association with each other. For example, in the table 109*b*, a reference noise pattern "reference noise pattern 1", reference coordinates "(X2, Y2, Z2)", reference accuracy "60%", movement velocity "1.5 m/sec", and an update time "20000202:22:10:05" are associated with a reference point ID "p1".

When comparing the occurring geomagnetic noise pattern with the comparison-target reference noise pattern, the geomagnetic noise pattern management unit 108 scales the comparison-target reference noise pattern in the direction of the time axis. In detail, the geomagnetic noise pattern management unit 108 obtains the movement velocity of the mobile terminal 1000 at the time when the mobile terminal 1000 passes the processing-target estimated current position coordinates, from the movement amount detection unit 104. This movement velocity is the movement velocity of the mobile terminal 1000 at the time when geomagnetic noise occurs. The geomagnetic noise pattern management unit 108 then scales the comparison-target reference noise pattern in the direction of the time axis, according to a ratio between the movement velocity of the mobile terminal 1000 at the time when the mobile terminal 1000 passes the processing-target estimated current position coordinates and the movement velocity associated with the comparison-target reference noise pattern in the table 109*b*. Hence, the occurring geomagnetic noise pattern and the comparison-target reference noise pattern are compared (pattern-matched) on the same scale.

When registering the occurring geomagnetic noise pattern in the table 109*b* as a new reference noise pattern, the geomagnetic noise pattern management unit 108 registers the occurring geomagnetic noise pattern outputted from the geomagnetic noise detection unit 106, without scaling it. The geomagnetic noise pattern management unit 108 also registers the movement velocity when the mobile terminal 1000 passes the processing-target estimated current position coordinates, in the table 109*b* in association with the new reference noise pattern.

Thus, in this variation, the comparison-target reference noise pattern is scaled so that the time-axis scale of the comparison-target reference noise pattern stored in the geomagnetic noise pattern storage unit 109 matches the time-axis scale of the occurring geomagnetic noise pattern. This makes it possible to search for the appropriate corrected reference noise pattern. In the case where the corrected reference noise pattern is not found, the movement velocity is also stored in the geomagnetic noise pattern storage unit 109 in association with the processing-target estimated current position coordinates and the like. Accordingly, the movement velocity necessary for scaling can be easily obtained and put to use.

(Variation 2)

Variation 2 of this embodiment is described below. The geomagnetic noise pattern management unit 108 according to this variation is characterized in that a plurality of reference noise patterns are registered in the table in the geomagnetic noise pattern storage unit 109 for one reference point.

FIG. 501 is a diagram showing the table in the geomagnetic noise pattern storage unit 109 according to this variation.

A table 109*c* indicates, for each reference point, a reference point ID for identifying the reference point, one or more reference noise patterns in the reference point, reference coordinates of the reference point, reference accuracy of the reference point, and an update time of the reference point in association with each other. For example, in the table 109*c*, reference noise patterns "reference noise patterns 1*a*, 1*b*", reference coordinates "(X2, Y2, Z2)", reference accuracy "60%", movement velocity "1.5 m/sec", and update times "20000202:22:10:05, 20000205:10:10:03" are associated with a reference point ID "p1".

In the case of determining that the corrected reference noise pattern is found in Step S404 in FIG. 498 (Step S404: Yes), the geomagnetic noise pattern management unit 108 according to this variation performs Steps S406 and S407, as in the above embodiment. Here, the geomagnetic noise pattern management unit 108 according to this variation further registers the occurring geomagnetic noise pattern in the table 109*c* as a new reference noise pattern so as to be associated with the same reference point ID as the corrected reference noise pattern.

When registering a new reference noise pattern in the table 109*c* in association with an existing reference point ID, the geomagnetic noise pattern management unit 108 also registers the time of the registration in the table 109*c* as a new update time, in addition to an existing update time.

When performing the search in Steps S402 and S403 in FIG. 498, the geomagnetic noise pattern management unit 108 according to this variation searches the table 109*c* including the two reference noise patterns 1*a* and 1*b* associated with the same reference coordinates (e.g. (X2, Y2, Z3)) for the corrected reference noise pattern corresponding to the occurring geomagnetic noise pattern.

Thus, in this variation, a plurality of reference noise patterns are stored in the geomagnetic noise pattern storage unit 109 in association with the same reference coordinates. This increases a probability of correcting the processing-target estimated current position coordinates to the above-mentioned same reference coordinates. That is, when a larger number of different reference noise patterns are registered in association with the same reference coordinates, the processing-target estimated current position coordinates are corrected to the same reference coordinates with a higher probability. As a result, a more proper position can be detected.

When the geomagnetic noise pattern management unit 108 performs pattern matching between the occurring geomagnetic noise pattern and each of the plurality of reference noise patterns associated with the same reference coordinates, the pattern matching may be performed on a reference noise pattern associated with a more recent update time, with higher priority. Since a more recent reference noise pattern has higher reliability, the processing-target estimated current position coordinates can be appropriately corrected in this way. That is, a geomagnetic noise pattern which varies with time can be handled, too.

(Variation 3)

Variation 3 of this embodiment is described below. The geomagnetic noise pattern management unit 108 according to this variation is characterized in that a reference noise pattern type is also registered in the table in the geomagnetic noise pattern storage unit 109.

FIG. 502 is a diagram showing an example of the occurring geomagnetic noise pattern.

For example, the magnetic field strength changes rapidly in an area, from among the geomagnetic noise occurrence areas, where an apparatus including many motors or coils exists, as shown in FIG. 502.

When comparing the occurring geomagnetic noise pattern with the reference noise pattern in Steps S402 and S403 in FIG. 498, the geomagnetic noise pattern management unit 108 according to this variation first specifies the type of the occurring geomagnetic noise pattern. In detail, the geomagnetic noise pattern management unit 108 compares the amount of change per unit time of the magnetic field strength in time series represented by the occurring geomagnetic noise pattern, with a threshold. In the case of determining that the amount of change is more than the threshold, the geomagnetic noise pattern management unit 108 specifies the type of the occurring geomagnetic noise pattern as "disturbed". In the case of determining that the amount of change is equal to or less than the threshold, the geomagnetic noise pattern management unit 108 specifies the type of the occurring geomagnetic noise pattern as "steady".

FIG. 503 is a diagram showing the table in the geomagnetic noise pattern storage unit 109 according to this variation.

A table 109*d* indicates, for each reference point, a reference point ID for identifying the reference point, a reference noise pattern in the reference point, a type of the reference noise pattern, reference coordinates of the reference point, reference accuracy of the reference point, and an update time of the reference point in association with each other. For example, in the table 109*d*, a reference noise pattern "reference noise pattern 1", a type "disturbed", reference coordinates "(X2, Y2, Z2)", reference accuracy "60%", and an update time "20000202:22:10:05" are associated with a reference point ID "p1". In addition, in the table 109*d*, a reference noise pattern "reference noise pattern 2", a type "steady", reference coordinates "(X3, Y3, Z3)", reference accuracy "80%", and an update time "20030303:23:13:03" are associated with a reference point ID "p2".

In the case where the type of the occurring geomagnetic noise pattern is "disturbed", the geomagnetic noise pattern management unit 108, without performing pattern matching, searches the table 109*d* for a reference noise pattern associated with the type "disturbed", as the similar reference noise pattern or the corrected reference noise pattern. For example, in the case where there are a plurality of reference noise patterns associated with the type "disturbed", the geomagnetic noise pattern management unit 108 searches the plurality of reference noise patterns for a reference noise pattern associated with reference coordinates closest to the processing-target estimated current position coordinates, as the corrected reference noise pattern.

In the case where the type of the occurring geomagnetic noise pattern is "steady", on the other hand, the geomagnetic noise pattern management unit 108 extracts each reference noise pattern associated with the type "steady", from the table 109*d*. The geomagnetic noise pattern management unit 108 then searches the one or more reference noise patterns associated with the type "steady" for the similar reference noise pattern or the corrected reference noise pattern, by pattern matching.

When registering the occurring geomagnetic noise pattern in the table 109*d* in the geomagnetic noise pattern storage unit 109 as a new reference noise pattern in Step S408 in FIG. 498, the geomagnetic noise pattern management unit 108 according to this variation also registers the type specified for the occurring geomagnetic noise pattern, in the table 109*d*.

Thus, in this variation, in the case where the type of the geomagnetic noise pattern is "disturbed", the reference noise pattern stored in the geomagnetic noise pattern storage unit 109 in association with the type "disturbed" is searched for as the corrected reference noise pattern. Therefore, the corrected reference noise pattern can be easily searched for, without performing pattern matching. This contributes to both reduced computation required for the search for the corrected reference noise pattern, and improved position detection accuracy. When the time-series change of the magnetic field strength represented by each of the occurring geomagnetic noise pattern and the comparison-target reference noise pattern is rapid, it is difficult to perform pattern matching. Through the search using the above-mentioned type, however, the appropriate corrected reference noise pattern can be detected even in such a case.

Though the position detection device 100 according to the present invention has been described by way of the above embodiment and variations, the present invention is not limited to such.

For example, though the above embodiment and variations describe the case where the position detection device 100 includes the angular velocity sensor 102 and the geomagnetic noise pattern storage unit 109, the position detection device 100 may not include the angular velocity sensor 102 and the geomagnetic noise pattern storage unit 109. In the case where the position detection device 100 does not include the geomagnetic noise pattern storage unit 109, the position detection device 100 may use any of the tables 109*a* to 109*d* stored in a recording medium externally connected to the position detection device 100. In the case where the position detection device 100 does not include the angular velocity sensor 102, the terminal posture detection unit 105, upon determining that geomagnetic noise occurs in Step S204 in FIG. 496, estimates the current orientation of the mobile terminal 1000 from the orientation last calculated before the occurrence of the geomagnetic noise, in Step S206. The geomagnetic noise detection unit 106 omits Steps S303 and S304 in FIG. 497 in this case.

Though the above embodiment and variations describe the case where the position detection device 100 includes the acceleration sensor 101, the movement amount detection unit 104, and the terminal posture detection unit 105, the position detection device 100 may not include the acceleration sensor 101, the movement amount detection unit 104, and the terminal posture detection unit 105. In such a case, the position detection device 100 includes a GPS sensor as an example, and the coordinate estimation unit 107 obtains position information from the GPS sensor and estimates the estimated current position coordinates based on the obtained position information. Alternatively, the position detection device 100 includes a wireless LAN communication unit as an example, and the coordinate estimation unit 107 obtains an electric field strength of a radio wave received by the wireless LAN communication unit and estimates the estimated current position coordinates based on the obtained electric field strength.

Though the above embodiment and variations describe the case where, in the case of determining that the reference accuracy is equal to or less than the estimated current position accuracy in Step S405 in FIG. 498, the geomagnetic noise pattern management unit 108 updates the reference accuracy in the table in the geomagnetic noise pattern storage unit 109, the reference accuracy may be updated at other timings. For instance, each time a reference point is passed, the geomagnetic noise pattern management unit 108 may increase reference accuracy corresponding to the reference point. In detail, each time Step S406 is performed for the same reference coordinates, the geomagnetic noise pattern management unit 108 increases the reference accuracy registered in the table in association with the same reference coordinates, by a predetermined level.

Though the above embodiment and variations describe the case where each of the occurring geomagnetic noise pattern and the reference noise pattern is treated as a three-axis (X, Y, and Z axes) pattern, one combined pattern may be used instead.

Though the above embodiment and variations describe the case where the geomagnetic noise detection unit 106 executes each step in the order in the flowchart shown in FIG. 497, Steps S303 and S304 may be performed before Step S302.

Though the above embodiment describes the case where the occurring geomagnetic noise pattern is scaled and Variation 1 describes the case where the reference noise pattern is scaled, any of the patterns may be scaled so long as the occurring geomagnetic noise pattern and the comparison-target reference noise pattern match in scale. For example, both patterns may be scaled.

The following cases are also included in the present invention.

(1) Each of the above-mentioned device (apparatus) and terminal is actually a computer system that includes a microprocessor, a ROM, a RAM, a hard disk unit, a display unit, a keyboard, a mouse, and the like. A computer program is stored in the RAM or the hard disk unit. Functions of each device (apparatus) can be achieved by the microprocessor operating in accordance with the computer program. The computer program mentioned here is a combination of a plurality of instruction codes that represent instructions to a computer for achieving predetermined functions.

(2) The components constituting each of the above-mentioned device (apparatus) and terminal may be partly or wholly implemented on one system LSI (Large Scale Integrated Circuit). The system LSI is an ultra-multifunctional LSI produced by integrating a plurality of components on one chip, and is actually a computer system that includes a microprocessor, a ROM, a RAM, and the like. A computer program is stored in the RAM. Functions of the system LSI can be achieved by the microprocessor operating in accordance with the computer program. For example, the integrated circuit includes the movement amount detection unit 104, the terminal posture detection unit 105, the geomagnetic noise detection unit 106, the coordinate estimation unit 107, the geomagnetic noise pattern management unit 108, the geomagnetic noise pattern storage unit 109, and the coordinate correction unit 110.

(3) The components constituting each of the above-mentioned device (apparatus) and terminal may be partly or wholly realized by an IC card or a single module that is removably connectable to the device (apparatus) or terminal. The IC card or the module is a computer system that includes a microprocessor, a ROM, a RAM, and the like. The IC card or the module may include the above-mentioned ultra-multifunctional LSI. Functions of the IC card or the module can be achieved by the microprocessor operating in accordance with the computer program. The IC card or the module may be tamper resistant.

(4) The present invention may also be the method described above. The present invention may also be a computer program that realizes the method by a computer. The present invention may also be a digital signal corresponding to the computer program.

The present invention may also be a computer-readable recording medium, such as a flexible disk, a hard disk, a CD-ROM, an MO, a DVD, a DVD-ROM, a DVD-RAM, a BD (Blu-ray Disc), or a semiconductor memory, on which the computer program or the digital signal is recorded. Conversely, the present invention may be the digital signal recorded on such a recording medium.

The present invention may also be the computer program or the digital signal transmitted via an electric communication line, a wired or wireless communication line, a network such as the Internet, data broadcasting, and the like.

The present invention may also be a computer system that includes a microprocessor and a memory. In this case, the computer program may be stored in the memory, with the microprocessor operating in accordance with the computer program.

The computer program or the digital signal may be provided to another independent computer system by distributing the recording medium on which the computer program or the digital signal is recorded, or by transmitting the computer program or the digital signal via the network and the like. The independent computer system may then execute the computer program or the digital signal to function as the present invention.

(5) The above embodiment and variations may be freely combined.

[Embodiment D1]

Embodiments D1 to D5 of the present invention describe an information display device that is capable of displaying a GUI in an orientation easily viewable by a user even when the user holds the information display device in various ways by, for example, changing its orientation.

The following describes Embodiments D1 to D5 of the present invention with reference to drawings.

Embodiment D1 describes flow of a process of detecting a centrifugal force or a user's operation of shaking a mobile device and changing a screen display orientation so that a GUI is displayed in an orientation easily viewable by the user.

FIG. 504 is a diagram showing a relationship between a posture and a screen display orientation of an information display device in Embodiment D1 of the present invention. As shown in FIG. 504, an initial state of a state in which the user is viewing the mobile device is set as (A). In (A), the mobile device is in a state in which its screen is displaced at 20° from a vertical direction with respect to a desk which is a horizontal plane. Rotating the mobile device 90° clockwise from this state results in (B) in which the mobile device is in a state of being portrait-oriented and the GUI is displayed so that a top side in the vertical direction corresponds to the top.

Thus, when the screen display unit of the mobile device is not in a horizontal position, the GUI can be displayed so that the top side in the vertical direction corresponds to the top, by detecting gravity using an acceleration sensor or the like.

When the mobile device is then laid horizontally as shown in (C), the display in (B) is maintained. After this, when the orientation of the mobile device is changed counterclockwise on the horizontal plane, the GUI is displayed in a direction that has been the top direction in (C), as shown in (D). Though the desk is used here to represent the horizontal plane, the mobile device may be placed on a floor or a ceiling, held with one hand or both hands, and the like.

A method of determining the display orientation when the terminal posture is changed to each of (C) and (D) from the detected state such as (A) or (B) is described in more detail below, with reference to FIG. 505. FIG. 505 is a diagram showing an internal structure of a processing unit that determines the screen display orientation of the information display device in Embodiment D1 of the present invention.

As shown in FIG. 505, the mobile device according to the present invention includes: an acceleration sensor 101; an angular velocity sensor 102; a geomagnetic sensor 103; a terminal posture detection unit 104 that detects, based on information from these sensors, terminal posture information such as the angle of the mobile device with respect to the horizontal plane and the orientation of the mobile device on the horizontal plane; a display orientation determination unit 105 that determines the display orientation of the GUI displayed on the screen of the mobile device based on the terminal posture information and the like; a time-series terminal state management unit 106 that stores, in a time-series terminal state storage unit 107, and manages the terminal posture information and the GUI display orientation as a past state of the terminal; and an image display unit 108.

The following describes process flow with reference to FIG. 506. FIG. 506 is a diagram showing process flow of the information display device in Embodiment D1 of the present invention.

First, in Step 100*a*, the terminal posture detection unit 104 determines whether or not a posture change of the terminal is detected from the various sensors. In the case where the posture change of the terminal is not detected, the process returns to Step 100*a*.

In the case where the posture change of the terminal is detected, the terminal posture detection unit 104 obtains the value of the acceleration sensor 101 to obtain the gravity direction in Step 100*b*.

Next, in Step 100*c*, the terminal posture detection unit 104 determines whether or not a tilt of the terminal equal to or more than an arbitrary angle (e.g. 20°) with respect to the horizontal plane is detected.

In the case where the determination in Step 100*c* results in Yes, the process goes to Step 100*d* in which the terminal posture detection unit 104 determines an uppermost side in the vertical direction by the tilt in the posture detected from the information of the gravity information.

Next, in Step 100*e*, the display orientation determination unit 105 changes the display screen orientation so that the detected side corresponds to the top of the screen display. Following this, in Step 100*f*, the time-series terminal state management unit 106 stores the terminal posture information together with the current display orientation.

Next, in Step 100*g*, it is determined whether or not the display process ends. In the case where the determination results in Yes, the process ends. In the case where the display process does not end (the determination results in No), the process returns to Step 100*a*.

In the case where the determination in Step 100*c* results in No, the process goes to W01 in FIG. 507.

The following describes process flow with reference to FIG. 507. FIG. 507 is a diagram showing process flow of the information display device in Embodiment D1 of the present invention.

First, in Step 101*a*, the display orientation determination unit 105 obtains immediately previous terminal posture information and display orientation from the time-series terminal state management unit 106.

Next, in Step 101*b*, the terminal posture detection unit 104 obtains an orientation change on the horizontal plane as the current terminal posture using one or both of the angular velocity sensor and the geomagnetic sensor.

Next, in Step 101*c*, the display orientation determination unit 105 compares the immediately previous terminal posture information and the current terminal posture information.

Next, in Step 101*d*, the display orientation determination unit 105 determines whether or not the immediately previous terminal posture information indicates the tilt of the terminal equal to or more than the arbitrary angle (e.g. 20°) with respect to the horizontal plane.

In the case where the determination results in Yes, the process goes to Step 101*e* in which the display orientation determination unit 105 continues the display without changing the immediately previous terminal display orientation. The process then returns to W02 in FIG. 506.

In the case where the determination results in No, the process goes to Step 101*f* in which the display orientation determination unit 105 determines whether or not the orientation change exceeds an arbitrary angle (70°).

Next, in Step 101*g*, the display orientation determination unit 105 changes the screen by 90° in a direction opposite to the orientation change. The process then returns to W02 in FIG. 506.

Thus, the information display device (mobile device) in this embodiment can display the GUI in the orientation easily viewable by the user.

[Embodiment D2]

Embodiment D2 discloses a method of setting an orientation using a centrifugal force and also setting an orientation using a shaking width of a housing of a mobile device in consideration of a state in which the mobile device is held with the user's hand(s).

FIG. 508 is a diagram showing an internal structure of a processing unit that sets an orientation of an information display device in Embodiment D2 of the present invention. The structure shown in FIG. 508 differs from the structure in Embodiment D1 in that a centrifugal force direction detection unit 111 is added.

The following describes process flow with reference to FIG. 509. FIG. 509 is a diagram showing process flow of the information display device in Embodiment D2 of the present invention.

First, in Step 110*a*, the terminal posture detection unit 104 obtains the value of the acceleration sensor 101 to obtain the gravity direction.

Next, in Step 110*b*, the terminal posture detection unit 104 calculates posture information of the terminal with respect to a horizontal line from the value of the gravity direction.

Next, in Step 110*c*, the terminal posture detection unit 104 determines whether or not the display unit of the terminal is in a substantially horizontal state within a predetermined error.

In the case where the determination results in Yes, the process goes to Step 110*e* in which the centrifugal force direction detection unit 111 obtains a value of acceleration in the horizontal direction.

Next, in Step 110*f*, the centrifugal force direction detection unit 111 determines whether or not the acceleration component in the horizontal direction continues to appear in a fixed direction while there is no component in the opposite direction within an arbitrary time period.

In the case where the determination results in Yes, the process goes to Step 110*h* to display a GUI so that a farther side in the obtained direction corresponds to the top. The process then goes to W03 in FIG. 510.

In the case where the determination results in No, the process goes to Step 110*g* to display the GUI according to the display orientation set beforehand. The process then goes to W03 in FIG. 510.

In the case where the determination in Step 110*c* results in No, the GUI is displayed so that the uppermost side by the tilt of the terminal corresponds to the top. The process then goes to W03 in FIG. 510.

The following describes process flow with reference to FIG. 510. FIG. 510 is a diagram showing process flow of the information display device in Embodiment D2 of the present invention.

First, in Step 111*a*, the terminal posture detection unit 104 obtains the value of the acceleration sensor 101 to obtain the gravity direction from a resultant vector.

Next, in Step 111*b*, the terminal posture detection unit 104 calculates a reference value of gravity based on position information measured and stored in the terminal. Alternatively, the terminal posture detection unit 104 obtains the reference value of gravity by accessing a server on a cloud based on the position information of the terminal.

Next, in Step 111*c*, the terminal posture detection unit 104 compares a resultant value of the obtained acceleration values of the three axes with the reference value of gravity, to determine whether or not the resultant value is more than the reference value of gravity.

In the case where the determination results in Yes, the process goes to Step 111*g* to correct the gravity direction so as to approach a largest vector.

Next, in Step 111*h*, the GUI is displayed so that a farther side in a direction indicated by the resultant vector except the gravity component on the horizontal plane corresponds to the top. The process then goes to W04 in FIG. 8.

In the case where the determination in Step 111*c* results in No, the process goes to Step 111*d* to determine whether or not the display unit of the terminal is in a substantially horizontal state within a predetermined threshold (angle).

In the case where the determination results in Yes, the process goes to Step 111*e* to display the GUI according to the display orientation set beforehand. The process then goes to W04 in FIG. 511.

In the case where the determination results in No, the process goes to Step 111*f* to display the GUI so that the uppermost side by the tilt of the terminal corresponds to the top. The process then goes to W04 in FIG. 511.

The following describes process flow with reference to FIG. 511. FIG. 511 is a diagram showing process flow of the information display device in Embodiment D2 of the present invention.

First, in Step 112*a*, the terminal posture detection unit 104 obtains the value of the acceleration sensor 101 to obtain the gravity direction.

Next, in Step 112*b*, the terminal posture detection unit 104 detects a side with a large shaking width in the detected posture from the angular velocity sensor 102 or the acceleration sensor 101.

Next, in Step 112*c*, the terminal orientation determination unit 105 sets the orientation of the GUI, using the detected side with the large shaking width and information set beforehand or stored previously and indicating a relationship between the side with the large shaking width and a front direction.

Next, in Step 112*d*, it is determined whether or not the terminal detects the front direction by a centrifugal force or a tilt exceeding a fixed value caused by the user within an arbitrary time period (e.g. 5 seconds).

In the case where the determination results in No, the process ends.

In the case where the determination results in Yes, the process goes to Step 112*e* to determine whether or not the side is different from the side detected based on the shaking width. In the case where the determination results in No, the process ends. In the case where the determination results in Yes, the process goes to Step 112*f* in which the terminal orientation determination unit 105 stores a relationship between the side with the large shaking width and the side detected by the user as the front direction within the subsequent fixed time period. The process then ends.

Thus, the information display device (mobile device) in this embodiment can display the GUI in the orientation easily viewable by the user, by setting the orientation using the centrifugal force and also setting the orientation using the shaking width of the housing of the mobile device in consideration of the state in which the mobile device is held with the user's hand(s).

[Embodiment D3]

This embodiment describes a method whereby a mobile device obtains position information of the mobile device itself by autonomous navigation using built-in sensors. This embodiment also describes a method of determining a screen orientation in the case where the mobile device displays a GUI or an application, using information of a periphery environment such as a peripheral device or entity whose position is registered beforehand or virtual tag information having position information.

FIG. 512 is a diagram showing a structure of an information display device in Embodiment D3 of the present invention.

The structure shown in FIG. 512 differs from the structure in Embodiment D1 in that a movement detection unit 121 that detects the amount of movement of the mobile device from information which the mobile device obtains from the built-in sensors, a coordinate estimation unit 122 that estimates coordinates of the current position of the mobile device, a pointing target search unit 123 that searches for peripheral environment information as a pointing target, and a position DB 124 which is a database for registering, as position information, a list of peripheral devices and entities as pointing targets and virtual tag information having position information.

Note that any sensor useful for specifying a position, such as a pressure sensor for detecting a height, can be used as a built-in sensor.

The position DB 121 may be provided in the terminal or on the cloud. That is, the position DB 121 is not limited to a particular storage location.

The following describes process flow with reference to FIG. 513. FIG. 513 is a diagram showing process flow of the information display device in Embodiment D3 of the present invention.

First, in Step 120*a*, the terminal posture detection unit 104 obtains the value of the acceleration sensor 101 to obtain the gravity direction.

Next, in Step 120*b*, the terminal posture detection unit 104 calculates posture information of the terminal with respect to the horizontal plane, from the value of the gravity direction.

Next, in Step 120*c*, the terminal posture detection unit 104 determines the terminal posture from the acceleration sensor 101, the angular velocity sensor 102, and the geomagnetic sensor 103.

Next, in Step 120*d*, the movement detection unit 121 obtains the value of the acceleration sensor 101 at the time of previous coordinate estimation.

Next, in Step 120*e*, the movement detection unit 121 obtains the terminal posture information from the terminal posture detection unit 104.

Next, in Step 120*f*, the movement detection unit 121 calculates a movement direction and a movement distance of the terminal, from the terminal posture information and the value of the acceleration sensor 101.

Next, in Step 120*g*, the coordinate estimation unit 122 calculates estimated current position coordinates which are current coordinates of the terminal, based on the movement direction and the movement distance from coordinates at immediately previous coordinate estimation.

Next, in Step 120*h*, the coordinate estimation unit 122 sets a coordinate estimation accuracy from a total amount of movement from past recognition of a reference point. The process then goes to W05 in FIG. 514.

The following describes process flow with reference to FIG. 514. FIG. 514 is a diagram showing process flow of the information display device in Embodiment D3 of the present invention.

First, in Step 121*a*, the pointing target search unit 123 checks whether or not the terminal is in a pointing target search state (e.g. a button press by the user, a specific position, a stationary state).

Next, in Step 121*b*, the pointing target search unit 123 determines whether or not the terminal is in the target search state.

In the case where the determination results in No, the process goes to W06 in FIG. 515. In the case where the determination results in Yes, the process goes to Step 121*c* in which the pointing target search unit 123 obtains the terminal posture from the terminal posture detection unit 104 and specifies the front direction of the terminal.

Next, in Step 121*d*, the pointing target search unit 123 obtains the coordinates of the terminal from the coordinate estimation unit 122.

Next, in Step 121*e*, the pointing target search unit 123 checks whether or not a target such as a device having position information registered in the position DB 124 exists in the front direction of the terminal from the coordinates of the terminal.

Next, in Step 121*f*, the pointing target search unit 123 determines whether or not the target exists.

In the case where the determination results in No, the process goes to W06 in FIG. 515. In the case where the determination results in Yes, the process goes to Step 121*g* to activate a function relating to the pointing target (e.g. control GUI of the target device). The process then goes to W06 in FIG. 515.

The following describes process flow with reference to FIG. 515. FIG. 515 is a diagram showing process flow of the information display device in Embodiment D3 of the present invention.

First, in Step 122*a*, the display orientation determination unit 105 determines whether or not the terminal is in a mode of displaying a GUI relating to the pointing target.

Next, in Step 122*b*, the display orientation determination unit 105 obtains the terminal posture from the terminal posture detection unit 104.

Next, in Step 122*c*, the display orientation determination unit 105 determines whether or not the display unit of the terminal is in a substantially horizontal state within a predetermined threshold (e.g. ±10°).

In the case where the determination results in Yes, the process goes to W08 in FIG. 516. In the case where the determination results in No, the process goes to W07 in FIG. 516.

The following describes process flow with reference to FIG. 516. FIG. 516 is a diagram showing process flow of the information display device in Embodiment D3 of the present invention.

In Step 123*a* from W07, the GUI is displayed so that the uppermost side by the tilt of the terminal corresponds to the top. The process then ends.

In Step 123*b* from W08, the display orientation determination unit 105 calculates a side closer to the pointing target on a straight line connecting the coordinates of the terminal and the coordinates of the pointing target.

Next, in Step 123*c*, the display orientation determination unit 105 determines whether or not the calculated side is within an arbitrary angle (e.g. 90°±20°) from the straight line connecting the coordinates of the terminal and the coordinates of the pointing target.

In the case where the determination results in Yes, the process ends. In the case where the determination results in No, the process goes to Step 123*d* to determine whether or not the accuracy of the position of the pointing target obtained from the position DB 124 is equal to or more than an arbitrary level (e.g. 80%). In the case where the determination results in Yes, the process ends. In the case where the determination results in No, the process goes to Step 123*e* in which the display orientation determination unit 105 determines whether or not the terminal is currently rotating, from information of the time-series terminal state management unit 106.

Next, in Step 123*f*, the display orientation determination unit 105 determines whether or not the terminal is rotating in a direction in which the calculated side is within the arbitrary angle (e.g. 90°±20°) from the straight line connecting the coordinates of the terminal and the coordinates of the pointing target.

In the case where the determination results in Yes, the process ends. In the case where the determination results in No, the process goes to Step 123*g* to continue the display without changing the current orientation. The process then ends.

FIG. 517 is a diagram showing an example of pointing target information stored in the position DB 124. As shown in FIG. 517, each target has absolute coordinates on a three-dimensional space or relative coordinates relative to a reference point used by the mobile device to specify the position. Each target may also have reference point accuracy information indicating accuracy of coordinates in the case where the target itself is regarded as a reference point. Each target may also have update time information in the case of updating the coordinates or the reference point accuracy information of the target.

Thus, the information display device in this embodiment can display the GUI so that the user can easily operate the mobile device even when the user holds the mobile device in various ways, in a situation where the user is aware of the target to be pointed.

[Embodiment D4]

A method of realizing display which is more user friendly by displaying an icon is described below. For example, an icon indicating a current posture of a mobile device is displayed to prevent a user from being confused about a relationship between a posture of a housing of the mobile device and a screen orientation of the mobile device in the case where the user changes the screen orientation of the mobile device.

The following describes a method of displaying an icon indicating an orientation of an information display device (mobile device) in Embodiment D4 of the present invention, with reference to drawings. FIG. 521 is a diagram showing icon variations always indicating a normal position of the terminal in the information display device (mobile device) in Embodiment D4 of the present invention. FIGS. 522 to 530 are each a diagram showing icon variations indicating the normal position in the information display device (mobile device) in Embodiment D4 of the present invention.

In FIG. 521, a top left icon on the screen of the mobile device is a reduced picture of the mobile device itself in which the button, camera, and speaker positions are exaggerated. This icon continues to be displayed always at an easily viewable position even when the screen orientation changes, to indicate the orientation of the terminal. In detail, the current position of the mobile terminal is displayed in the top left corner, regardless of whether the mobile terminal is portrait-oriented or landscape-oriented. Here, whichever orientation the housing of the mobile device is in, the orientation of the icon with respect to the housing is unchanged. That is, even when other content on the screen is changed in orientation, the icon is displayed in the same orientation as the housing.

The icon may be displayed in the bottom right corner or the bottom left corner as shown in FIG. 525. The icon may also be displayed in the top right corner. Thus, the display position of the icon on the screen is not particularly limited. Though the picture tilted at 70° from the horizontal plane is used here, this is merely an example, and the angle is not limited to such.

FIGS. 522 and 523 each show icon variations, too. FIGS. 524(A) to 530 each disclose an icon in the case where only one of left and right pictures or only one of upper and lower pictures is displayed in each of the landscape orientation and the portrait orientation. Depending on the mobile device, there is a proper position (normal position) based on, for example, a requirement that the camera is located above in the portrait position and the landscape position such as when the camera and the speaker are front-mounted, as shown in FIG. 524. In such a case, only two types of icons need to be displayed to the user, to indicate the normal position in the portrait orientation and the normal position in the landscape orientation.

FIGS. 531 to 537 are each a diagram showing an icon for calling the user's attention to the normal position in the information display device in Embodiment D4 of the present invention.

For example, as shown in FIG. 531, the top direction of the icon corresponds to the direction of the normal position in the portrait orientation. When the posture of the mobile device is opposite to the normal position in the portrait orientation, the icon is upside down, which the user finds strange. This can prompt the user to set the mobile device in the normal position. FIGS. 532 to 537 each disclose an icon for calling the user's attention to the normal position, too. Another example shown in each drawing relates to an icon displayed in the top left corner.

Moreover, by using a left-right asymmetrical icon to assume directionality, it is possible to suggest to the user in which direction the terminal is to be rotated to attain the normal position from the current position. For example, as shown in FIG. 531, the icon of the eye looking to the right indicates that the terminal can be in the normal position by setting the right side of the terminal at the top. In each of FIGS. 532 to 537, too, the orientation of the face, the finger, or the body of the icon indicates the direction of the normal position.

FIG. 529 shows an icon that appears as different pictures in the portrait orientation and the landscape orientation. An icon appearing to be a bird in the landscape orientation appears to be a rabbit in the portrait orientation. Likewise, an icon appearing to be a penguin in the landscape orientation appears to be a sunfish in the portrait orientation. This allows the user to feel that the housing is not properly oriented when the picture appears to be strange.

Thus, the display of such an icon that prompts the user to correct the orientation is possible. Here, a module for displaying an icon recognizes the top direction of the screen beforehand and displays the icon according to the landscape orientation or the portrait orientation with respect to the top of the GUI.

[Embodiment D5]

This embodiment describes an electrical structure of a mobile terminal such as a digital camera as one aspect of an information display device, with reference to FIG. 538. FIG. 538 is a diagram showing a structure of a mobile terminal which is one aspect of an information display device in Embodiment D5 of the present invention.

[1-1. Overview]

A mobile terminal 5000 in this embodiment is a multifunctional mobile terminal that includes an external input unit such as a touch panel and a display and is capable of internet browsing, video viewing, listening to music, TV and other household product operation, and the like. The mobile terminal 5000 in this embodiment is assumed to be rotated in portrait or landscape orientation, for its intended use. By rotating a screen in a direction of a user and displaying the screen, the screen can always be displayed in an easy-to-view direction in whichever way the user rotates the mobile terminal 500.

[1-2. Structure]

[1-2-1. Electrical Structure]

The mobile terminal 5000 shown in FIG. 538 includes an angular velocity sensor 1002 and a geomagnetic sensor 1003. Through the use of the inputs of these sensors, a display direction control unit 1005 detects from which direction the user currently holds the mobile terminal 5000, and determines a display direction. The display direction control unit 1005 notifies the determined display direction to a screen display control unit 1006. The screen display control unit 1006 generates information to be actually outputted to a display 1004 in the mobile terminal 5000 based on the information from the display direction control unit 1005, and provides the information to the display 1004. The display 1004 displays the received information on a display screen. The following describes the structure of the mobile terminal 5000 in detail.

An external input unit 1030 is made up of a touch panel, a hardware key, and the like. The external input unit 1030 receives user operations, thereby receiving various inputs for operating the mobile terminal 5000. In the case where the display 1004 is equipped with a touch panel to receive external operations, the display 1004 may also be used as the external input unit 1030.

A controller 1020 is a control means for controlling the entire mobile terminal 5000. The controller 1020 can be implemented by a semiconductor device and the like. The controller 1020 may be made up of hardware only, or made up of a combination of hardware and software. The controller 1020 may be implemented by a microcomputer and the like. The controller 1020 is capable of controlling a screen display direction for high user friendliness based on a direction or a vertical tilt of the mobile terminal 5000 detected by the angular velocity sensor 1002, the geomagnetic sensor 1003, and the like, and displaying the screen (described in detail later).

The angular velocity sensor 1002 is a sensor for detecting an angular velocity of the mobile terminal 5000, and is capable of detecting angular velocities in directions of a plurality of axes.

The geomagnetic sensor 1003 is a sensor for detecting direction information of the mobile terminal 5000 in the horizontal direction, and is capable of obtaining the direction information.

The display direction control unit 1005 controls the display direction of the mobile terminal 5000 based on the information from the angular velocity sensor 1002 and the geomagnetic sensor 1003. For example, in the case of detecting that the mobile terminal 5000 is rotated 90° clockwise in the horizontal direction, it can be assumed that the user rotates the mobile terminal 5000 from the long side direction to the short side direction. The display direction control unit 1005 can accordingly exercise such control that instructs to rotate the display screen 90° counterclockwise. At which timing and to what extent the rotation is performed will be described later.

The screen display control unit 1006 actually generates a UI screen to be provided to the display 1004, based on the information from the display direction control unit 1005. The screen display control unit 1006 may be implemented by software, or implemented by a hybrid of hardware and software where, for example, a high-load process is implemented by hardware.

The display 1004 is capable of displaying the UI screen received from the screen display control unit 1006. The display 1004 is capable of displaying information read from a memory 1010. The display 1004 is also capable of displaying various menu screens for various settings of the mobile terminal 5000 and the like.

The memory 1010 is made up of a flash memory, a ferroelectric memory, and the like. The memory 1010 stores a control program for controlling the entire mobile terminal 5000, button and icon information for generating typical menu screens, video and music information, text information, information such as threshold information for changing the display direction of the mobile terminal 5000, and so on. In this embodiment, the memory 1010 particularly stores an initial display direction which is information for determining whether or not to switch the display direction, horizontal rotation threshold information, vertical rotation threshold information, display menu information to be switched, and library information for rotating a current menu screen.

[1-2-2. Correspondence of Terms]

The angular velocity sensor 1002 is an example of an information obtainment unit that detects a posture of the mobile terminal 5000. The geomagnetic sensor 1003 is an example of a unit that detects a horizontal orientation, i.e. direction information, and a horizontal rotation of the mobile terminal 5000.

The controller 1020 is an example of an information obtainment unit, a rotation determination unit, a rotation detection unit, and a control unit. The internal memory 1010 is an example of a storage unit. The display 1004 is an example of a display unit.

[1-3-1. Use Case]

An example of a use case assumed in this embodiment is described below, with reference to FIGS. 539 and 540.

As shown in FIG. 539, suppose a user A is operating the mobile terminal 5000 with its short side facing the user A (referred to as portrait holding in this embodiment). Even in the case where it is preferable that the long side faces the user A (referred to as landscape holding in this embodiment) such as when the user A views video, the screen does not rotate as shown in the right part of FIG. 539. Accordingly, when the user A switches from the portrait holding to the landscape holding, an operation of rotating the screen needs to be performed separately.

In this embodiment, however, in the case where the user A switches from the portrait holding as shown in the left part of FIG. 540 to the landscape holding as shown in the right part of FIG. 540, the screen is automatically rotated in the direction easily viewable by the user A.

[1-3-2. Display Screen Rotation Control (Overall)]

To describe a series of operations of the mobile terminal 5000 in this embodiment, the use case is separated between a normal case and a special case for convenience's sake.

FIGS. 541 and 542 are each a diagram showing definitions of variables relating to horizontal and vertical postures of the mobile terminal 5000, which are used in the description of this embodiment.

Variables relating to a horizontal direction of the mobile terminal 5000 are defined with reference to FIG. 541. A direction of the mobile terminal 5000 in an initial state of the mobile terminal 5000 is defined as D0. A current direction of the mobile terminal 5000 as a result of horizontal rotation is defined as D1.

Though this embodiment describes the direction information using D0 and D1, any information for detecting the horizontal rotation of the mobile terminal 5000 may be used as D0 and D1. For example, a relative direction of the mobile terminal 5000 may be detected by accumulating horizontal acceleration using a gyroscope.

Next, variables relating to a vertical tilt of the mobile terminal 5000 are defined with reference to FIG. 542. Suppose a tilt when the mobile terminal 5000 is oriented horizontally is 0°, and a tilt when the mobile terminal 5000 is erected vertically is 90°. A current tilt of the mobile terminal 5000 is defined as H. HThr is a vertical tilt threshold for display rotation described later.

FIG. 543 is a diagram showing an example of a menu screen in the case where the mobile terminal 5000 is operated as a TV remote control. Portrait display of the mobile terminal 5000 is shown in the left part of FIG. 543, whereas landscape display of the mobile terminal 5000 is shown in the right part of FIG. 543. In the case of the portrait display, channel buttons are displayed in a larger size. In the case of the landscape display, accompanying information about programs and the like are displayed, too. Changing the display contents between the portrait display and the landscape display in this manner allows the user to easily access desired information. FIGS. 544 to 547 are each a diagram showing an example of a use case where the mobile terminal 5000 is operated as a TV remote control. FIG. 548 is a diagram showing an example of a use case of another operation of the mobile terminal 5000.

The following describes control flow of the mobile terminal 5000 in this embodiment, with reference to FIGS. 549 to

554. FIGS. 549 to 554 are each a diagram showing control flow of the mobile terminal 5000 in Embodiment D5 of the present invention.

First, in Step 601*a*, the mobile terminal 5000 is powered on.

Next, in Step 601*b*, the display direction control unit 1005 obtains the current direction information D1 of the mobile terminal 5000 from the geomagnetic sensor 1003.

Next, in Step 601*c*, the display direction control unit 1005 initializes the initial display direction Do using the direction information D1.

Next, in Step 601*e*, the display direction control unit 1005 detects whether or not horizontal rotation is permitted. In the case where the determination results in No, the process goes to Step 601*h*. In the case where the determination results in Yes, the process goes to Step 601*f*.

Regarding whether or not horizontal rotation is permitted, the status of whether or not to permit rotation for the mobile terminal 5000 can be set by a user operation. In the case where the mobile terminal 5000 is operated as a remote control as shown in FIG. 544, there is an instance where the display is not rotated even when the rotation of the mobile terminal 5000 is detected. Accordingly, any unintended screen rotation can be prevented by providing the function of permitting or not permitting horizontal display rotation.

Next, in Step 601*f*, the display direction control unit 1005 obtains the current initial direction information D0 of the mobile terminal 5000 and the horizontal rotation threshold DThr from the memory 1010.

Next, in Step 601*g*, the display direction control unit 1005 obtains the current direction information D1 of the mobile terminal 5000 from the geomagnetic sensor 1003.

Next, in Step 601*h*, the display direction control unit 1005 determines whether or not the detected direction information D1 changes from the initial direction information D0 by DThr or more. In the case where the determination results in No, the process goes to Step 601*d*. In the case where the determination results in Yes, the process goes to Step 601*j*.

Next, in Step 601*j*, the display direction control unit 1005 records a rotation detection start time for the first time only.

Next, in Step 601*k*, the display direction control unit 1005 detects whether or not a predetermined time period has elapsed from the rotation detection time.

In the case where the determination results in No, the process goes to Step 601*m* to wait for a fixed time period, and then goes to Step 601*g*. In the case where the determination results in Yes, the process goes to Step 601*n*.

The reason for providing the fixed time period for detecting the amount of rotation in Steps 601*j* to 601*n* is to enable smooth rotation of the mobile terminal 5000 in the case where the user rotates the mobile terminal 5000 by at least twice the rotation threshold such as when rotating the mobile terminal 5000 180°. This is also intended to prevent a situation where, for example when the mobile terminal 5000 is rotated once by at least the rotation threshold and then immediately rotated in the opposite direction, opposite rotation continuously occurs and causes the user to experience flickering vision.

Next, in Step 601*n*, the display direction control unit 1005 detects whether the display plane of the mobile terminal 5000 faces upward or downward in the vertical direction.

Next, in Step 601*o*, the display direction control unit 1005 notifies the screen display control unit 1006 of an instruction to rotate the screen so that the D0 direction corresponds to the top of the display screen.

Steps 601*n* and 601*o* are performed because, for example in the case where the user lying on his/her back operates the mobile terminal 5000 as shown in FIG. 548, the direction in which the screen is rotated for correction when the mobile terminal 5000 is set in the D1 direction is different between when the display 1004 of the mobile terminal 5000 faces downward in the vertical direction and when the display 1004 of the mobile terminal 5000 faces upward in the vertical direction.

Next, in Step 601*p*, the display direction control unit 1005 performs a screen rotation flicker and threshold control process.

Next, in Step 601*r*, the screen display control unit 1006 determines whether or not new screen generation is possible. In the case where the determination results in No, the process goes to Step 601*s* to wait for a fixed time period, and then goes to Step 601*q*. In the case where the determination results in Yes, the process goes to Step 601*t*.

This step corresponds to a process of, for example in the case where software in a user interface layer of the mobile terminal 5000 is engaged in another process (e.g. screen scroll) of higher priority, waiting for the higher-priority process to complete.

Next, in Step 601*t*, the screen display control unit 1006 determines whether or not to newly generate a rotation target screen.

In the case where the determination results in No, the process goes to Step 601*x* to rotate the previous display screen and render the screen on the display 1004. In the case where the determination results in Yes, the process goes to Step 601*u*.

The reason for newly generating the rotation target screen in Step 601*t* is as follows.

The mobile terminal 5000 is assumed to be put to various uses such as a video player and a TV remote control, as mentioned earlier. Accordingly, depending on the function used by the mobile terminal 5000, there are an instance (e.g. video player) where it is preferable to simply rotate the display direction and an instance (e.g. remote control) where it is preferable to change the display contents between the portrait display and the landscape display. Step 601*t* is intended to further improve user friendliness when the user rotates the mobile terminal 5000.

Next, in Step 601*u*, the screen display control unit 1006 generates a new screen.

Next, in Step 601*v*, the display 1004 renders the generated new screen.

Next, in Step 602*a*, the display direction control unit 1005 obtains current elevation angle information H1 of the mobile terminal 5000 from the angular velocity sensor 1002.

Next, in Step 602*b*, the display direction control unit 1005 determines whether or not the absolute value of the detected elevation angle information H1 is more than a vertical rotation threshold HThr2.

In the case where the determination results in No, the process goes to Step 601*w*. In the case where the determination results in Yes, the process goes to Step 602*c*.

Next, in Step 602*c*, the display direction control unit 1005 notifies the screen display control unit 1006 of an instruction to rotate the screen so that a higher side of the screen corresponds to the top of the display screen.

Next, in Step 602*d*, the screen display control unit 1006 determines whether or not to newly generate a rotation target screen.

In the case where the determination results in No, the process goes to Step 602*g* to rotate the previous display screen and render the screen on the display 1004. In the case where the determination results in Yes, the process goes to Step 602*e*.

Next, in Step 602*e*, the screen display control unit 1006 generates a new screen.

Next, in Step 602*f*, the display 1004 renders the generated new screen.

Next, in Step 602*j*, the display direction control unit 1005 obtains the current elevation angle information H1 of the mobile terminal 5000 from the angular velocity sensor 1002.

Next, in Step 602*k*, the display direction control unit 1005 determines whether or not the absolute value of the detected elevation angle information H1 is less than a vertical rotation threshold HThr1.

In the case where the determination results in No, the process goes to Step 602*h*. In the case where the determination results in Yes, the process goes to Step 602*m*.

Next, in Step 602*k*, the display direction control unit 1005 sets the current direction D1 as D0.

In Steps 602*j* to 602*m*, the current direction of the mobile terminal 5000 when the user returns the mobile terminal 5000 in the horizontal direction after tilting it in the vertical direction is set as the initial direction D0, thus enabling the rotation direction to be reset or corrected.

The following describes operations when the mobile terminal 5000 returns from a sleep state, with reference to FIG. 554.

First, in Step 603*a*, the mobile terminal 5000 detects return from a sleep state.

Upon detection of the return from the sleep state, the process goes to Step 603*b*.

Next, in Step 603*b*, the screen display control unit 1006 reads a display direction at previous sleep from the memory.

Next, in Step 603*c*, the screen display control unit 1006 renders the screen in the same display direction as the display direction at the previous sleep, on the display 1004.

The process then goes to Step 601*d*.

Though this embodiment describes the case where horizontal rotation is performed after initialization (or return from sleep), a process of performing vertical rotation may be executed as in FIGS. 555 to 559. FIGS. 555 to 559 are diagrams showing another control flow of the mobile terminal 5000 in Embodiment 5 of the present invention.

There is a possibility that, upon initialization or return from sleep, the initial direction D0 in the horizontal direction or the current direction information D1 in the horizontal direction of the mobile terminal 5000 do not match the actual values. Accordingly, the vertical rotation determination is performed immediately after such initialization or return from sleep, with it being possible to rotate the display screen more precisely.

[1-3-3. Display Screen Rotation Control (Detail)]

Step 601*e* in FIG. 550 is described in detail below, with reference to FIGS. 544, 545, and 546. The mobile terminal 5000 has many functions such as a general-purpose remote control function, as mentioned earlier. For example, in the case where, when operating the mobile terminal 5000 in a general-purpose remote control mode, the user rotates while holding the remote control in order to operate a component located at 90° from a TV, the display direction is rotated too, which impairs user friendliness. The same applies to the case where the user who is surfing the Internet or the like using the mobile terminal 5000 switches the mobile terminal 5000 to the remote control mode and points the mobile terminal 5000 at the TV in order to operate the TV, as shown in FIG. 546. It is therefore preferable that the mobile terminal 5000 has, for each operation mode, rotation determination of whether or not rotation such as vertical rotation or horizontal rotation is performed, as shown in FIG. 547. This can prevent any screen rotation unintended by the user, contributing to improved operability.

In this embodiment, for example when operating a TV placed on a floor using the mobile terminal 5000, if the mobile terminal 5000 is tilted more than the vertical rotation threshold HThr2, the screen is rotated, which impairs user friendliness. It is therefore desirable that the vertical rotation threshold and the horizontal rotation threshold of the mobile terminal 5000 are variable according to the operation mode.

Moreover, since the TV is typically operated by infrared radiation, in such a case where a plane from which infrared radiation is transmitted faces downward in the mobile terminal 5000 in the remote control mode, user operability can be improved by, for example, increasing the vertical rotation threshold HThr2 or suppressing vertical rotation.

[Embodiment D6]

This embodiment describes operations when the user uses a mobile device while standing the mobile device on a desk or laying and rotating the mobile device on the desk, with reference to FIGS. 560 to 570.

The following describes process flow shown in FIG. 560.

First, in Step 1020*a*, the process starts. Next, in Step 1020*b*, a direction in which the mobile device is oriented when the mobile device is laid horizontally is set as a reference direction, and an orientation of a screen of the mobile device when the mobile device is laid horizontally is set as a screen display direction optimal for a user. A method of updating the reference direction will be described in detail later with reference to FIG. 561.

Next, in Step 1020*c*, a value of a direction sensor is obtained as a current direction.

Next, in Step 1020*d*, a difference between the reference direction and the current direction is calculated as a rotation angle.

Next, in Step 1020*e*, the screen display direction is determined based on a relationship between the rotation angle and a screen display table. A method of determining the screen display direction will be described in detail later with reference to FIGS. 567 to 569.

Next, in Step 1020*f*, the screen is displayed. The process then returns to Step 1020*b*.

FIG. 561 is a flow diagram showing the reference direction update method in FIG. 560 (Step 1020*b*). The following describes process flow shown in FIG. 561.

First, in Step 1010*a*, the process starts. Next, in Step 1010*b*, whether or not the mobile device is laid horizontally is detected. A method of detecting whether or not the mobile device is laid horizontally will be described in detail later with reference to FIGS. 562 to 564.

Next, in Step 1010*c*, whether or not the horizontal laying of the mobile device is detected is determined.

In the case where the determination results in No, the process goes to Step 1010*f* to end. In the case where the determination results in Yes, the process goes to Step 1010*d* to retain the value of the direction sensor of the mobile device when laid horizontally as the reference direction, and Step 1010*e* to retain the display screen direction from the rotation direction of the mobile device when laid horizontally. A method of determining the display screen direction will be described in detail later with reference to FIGS. 565 and 566.

In Step 1010*f*, the process ends.

FIG. 562 is a flow diagram showing the method of detecting the horizontal laying of the mobile device (1010*b*) in FIG. 561.

The following describes process flow shown in FIG. 562.

First, in Step 1030*a*, the process starts.

Next, in Step 1030*b*, the previous horizontal state of the mobile device is obtained.

Next, in Step 1030*c*, an absolute value of a three-axis magnetic sensor is obtained. FIG. 563 is a diagram showing an example of directions of three axes of the magnetic sensor of the mobile device.

Next, in Step 1030*d*, whether or not a sum of sensor values of the x axis and the y axis is more than a sensor value of the z axis by at least a threshold is determined.

In the case where the determination in Step 1030*d* results in Yes, the process goes to Step 1030*e* to determine the current horizontal state as "horizontal".

Next, in Step 1030*g*, whether or not the previous horizontal state is "non-horizontal" and the current horizontal state is "horizontal" is determined.

In the case where the determination in Step 1030*g* results in Yes, the process goes to Step 1030*h* to determine that the mobile device is laid horizontally. The process then ends in Step 1030*i*.

In the case where the determination in Step 1030*d* results in No, the process goes to Step 1030*f* to determine the current horizontal state as "non-horizontal". The process then goes to Step 1030*g*. In the case where the determination in Step 1030*g* results in No, the process goes to Step 1030*i* to end.

The following describes the method of detecting the display screen direction (1010*e*) in FIG. 561, with reference to FIGS. 565 and 566. First, in Step 1070*a*, the process starts. Next, in Step 1070*b*, values of a gyroscope immediately before and after the mobile device is laid horizontally (Pitch and Roll) are obtained, and change amounts of Pitch and Roll is calculated. Pitch and Roll of the mobile device mentioned here are respectively rotation angles in the x axis and the y axis in FIG. 565.

Next, in Step 1070*c*, whether or not the change amount of Pitch is more than the change amount of Roll is determined.

In the case where the determination results in Yes, the process goes to Step 1070*d* to determine whether or not Pitch>0. In the case where the determination results in Yes, the process goes to Step 1070*e* to retain the +y axis direction as the display screen direction. The process then ends in Step 1070*j*. In the case where the determination in Step 1070*d* results in No, on the other hand, the process goes to Step 1070*f* to retain the −y axis direction as the display screen direction. The process then ends in Step 1070*j*.

In the case where the determination in Step 1070*c* results in No, the process goes to Step 1070*g* to determine whether or not Roll>0. In the case where the determination results in Yes, the process goes to Step 1070*h* to retain the +x axis direction as the display screen direction. The process then ends in Step 1070*j*.

In the case where the determination in Step 1070*g* results in No, the process goes to Step 1070*i* to retain the −x axis direction as the display screen direction. The process then ends in Step 1070*j*.

The screen display direction in FIG. 561 is described below, with reference to FIGS. 567 to 569.

The following describes process flow shown in FIG. 569.

First, in Step 1100*a*, the process starts. Next, in Step 1100*b*, transition steps are calculated from a rotation angle with reference to a screen display direction change table shown in FIG. 567.

Next, in Step 1100*c*, the retained state of the display screen direction of the mobile device when laid horizontally is obtained with reference to a screen display direction transition diagram shown in FIG. 568.

Next, in Step 1100*d*, the step is advanced from the state obtained in Step 1100*c*, by the steps calculated in Step 1100*b*.

Next, the direction of the state advanced in Step 1100*e* is retained as the display screen direction. The process then ends in Step 1100*f*.

According to this method, it is possible to achieve an advantageous effect of displaying the screen of the mobile device always in the direction suitable for the user even in the case where the user uses the horizontally laid mobile device while repeatedly rotating it.

For example, suppose the mobile device in the state of FIG. 504(B) is laid horizontally on the desk as in the state of FIG. 504(C), and then rotated 90° counterclockwise as in the state of FIG. 504(D). It is desirable for the user that the screen display is always made in his/her direction.

Here, according to the flow in FIG. 566, the side of 001-*a* shown in FIG. 504 is regarded as the rotation angle, and the +y axis direction is retained as the display screen direction. An example of rotation in this case is described below, with reference to FIG. 570. In FIG. 570(A), the direction of the mobile device is 270°. Since 270° is the direction when the mobile device is laid horizontally, the reference direction of 270° is retained. In FIG. 572(B), the direction of the mobile device when the user rotates the mobile device is 230°. In this case, the rotation angle is 230−270=−40°. With reference to the screen display direction change table in FIG. 567, −40° corresponds to the rotation display direction transition of 0 step, so that the screen display direction remains to be the +y direction. Following this, in the case where the user rotates the mobile device to the state of FIG. 572(C), the current direction of the mobile device is 180°. At this time, the rotation angle is 180−270=−90°. With reference to the screen display direction change table in FIG. 567, −90° corresponds to three steps. Since the current direction is the +y axis direction in the screen display direction transition diagram in FIG. 568, the +x axis direction as a result of advancing three steps is the new screen display direction.

Though the method using the magnetic sensor in FIG. 562 is described as the method of detecting whether or not the mobile device is laid horizontally (Step 1010*b*) in FIG. 569, a detection method using an acceleration sensor may instead be employed. The detection method using the acceleration sensor is described below, with reference to FIG. 564.

First, in Step 1050*a*, the process starts. Next, in Step 1050*b*, the previous horizontal state of the mobile device is obtained.

Next, in Step 1050*c*, the value of the acceleration sensor is obtained.

Next, in Step 1050*d*, whether or not a difference between acceleration and dynamic acceleration in the directions of the two axes is equal to or less than a threshold is determined.

In the case where the determination results in Yes, the process goes to Step 1050*e* to determine the current horizontal state as "horizontal".

Next, in Step 1050*g*, whether or not the previous horizontal state is "non-horizontal" and the current horizontal state is "horizontal" is determined.

In the case where the determination results in Yes, the process goes to Step 1050*h* to determine that the mobile device is laid horizontally. The process then ends in Step 1050*i*.

In the case where the determination in Step 1050*d* results in No, the process goes to Step 1050*f* to determine the current horizontal state as "non-horizontal". The process then goes to Step 1050*g*. In the case where the determination in Step 1050*g* results in No, the process goes to Step 1030*i* to end.

Instead of using the direction sensor, a gyroscope may be used to detect the rotation of the device so that the display screen is changed according to the rotation of the device. In this method, though a cumulative error occurs at each rotation as compared with the direction sensor, there is an advantageous effect of displaying the screen in an appropriate orientation according to the rotation of the device even when the device includes no direction sensor.

In Embodiment D5 of the present invention, the mobile terminal 5000 may be equipped with a proximity sensor, a contact sensor, or the like so that a start screen upon return from sleep is directed to the user. In this way, the screen can be automatically rotated in the direction easily viewable by the user, in whichever position relationship between the mobile terminal 5000 and the user upon return from sleep or power on.

In Embodiment D5 of the present invention, control may be exercised to suppress rotation of the mobile terminal 5000 while the mobile terminal 5000 is in a moving car. In detail, rotation control may be exercised in conjunction with an in-car mode and, in the case where a movement velocity is equal to or more than a threshold according to a GPS or acceleration information, screen rotation may be suppressed based on determination that the mobile terminal 5000 is in a moving car or other transportation means. This improves user friendliness.

[Embodiment E1]

Embodiment C of the present invention describes a position estimation device that estimates a position of a wireless terminal with high accuracy, by reducing an influence exerted on a receiving electric field strength of a radio wave by a terminal posture of the wireless terminal or a positional relationship of a base station, the wireless terminal, and a user.

The following describes Embodiment E1 of the present invention with reference to drawings. For example, a position estimation device 100 according to the present invention is included in a wireless terminal such as a mobile phone, and has a function of estimating the current position of the wireless terminal (hereafter referred to as "target terminal").

(1-1. Structure)

FIG. 576 is a block diagram showing a structure of the position estimation device 100 according to Embodiment E1. As shown in FIG. 576, the position estimation device 100 includes a sensor unit 101, a wireless processing unit 104, a control unit 105, and a storage unit 114. The sensor unit 101 includes an acceleration sensor 102 and a direction sensor 103. The control unit 105 includes a terminal information detection unit 106, a wireless strength measurement unit 110, a distance estimation unit 111, a position estimation unit 112, and a correction unit 113. The terminal information detection unit 106 includes a placement information detection unit 107, a movement direction detection unit 108, and a terminal posture detection unit 109.

The acceleration sensor 102 detects acceleration of the target terminal in three axial directions, converts the detected acceleration into an electrical signal, and outputs the electrical signal to the terminal information detection unit 106 as acceleration information.

The geomagnetic sensor 103 detects geomagnetism in the three axial directions, converts the detected geomagnetism into an electrical signal, and outputs the electrical signal to the terminal information detection unit 106 as geomagnetism information.

The wireless processing unit 104 includes an antenna or the like, and has a function to transmit and receive a wireless signal to communicate with a base station. The base station is a device for performing wireless communication with wireless terminals including the target terminal. Examples of the base station include a master station of a mobile phone or a PHS, a wireless LAN access point, and so on.

The terminal posture detection unit 107 calculates, through the use of the acceleration information and the geomagnetism information received from the sensor unit 101, the posture of the target terminal with respect to a gravity direction from the acceleration information, and the posture of the target terminal with respect to a plane rectangular coordinate system from the geomagnetism information. The terminal posture detection unit 107 outputs each calculated posture to the correction unit 113 as terminal posture information of the target terminal.

The movement direction detection unit 108 determines the movement direction of the target terminal based on the acceleration information and the geomagnetism information received from the sensor unit 101, and outputs the movement direction to the correction unit 113 as movement direction information.

The terminal posture detection unit 107 and the movement direction detection unit 108 may use information other than the geomagnetism information from the geomagnetic sensor, such as angular velocity information from an angular velocity sensor, to calculate the direction of the target terminal and calculate the terminal posture information and the movement direction respectively.

The placement state detection unit 109 detects a placement state indicating at which part of the user the target terminal is placed. The placement state detection unit 109 determines the placement state by performing matching between a pattern of the acceleration information received from the sensor unit 101 and a model pattern of acceleration information in each placement state which is stored in the storage unit 114 beforehand. The placement state detection unit 109 outputs the placement state to the correction unit 113 as placement state information.

FIG. 579 is a diagram showing an example of model pattern information 400 in each placement state stored in the storage unit 114. A model pattern is waveform data of acceleration information. A field of each model pattern holds an address of an area in which actual waveform data is stored. By accessing the storage area indicated by the address, the model pattern of the acceleration information in the corresponding placement state can be obtained.

Accuracy information indicates whether user data (data of the user of the target terminal) or general data is used for the model pattern. The accuracy information indicates the general data in an initial state, and is updated to the user data as a result of obtaining user information by an application of the target terminal or the like. It is possible to calculate the determination accuracy of the placement state according to the accuracy information, and change the amount of correction in the below-mentioned process depending on the determination accuracy. As with the accuracy information, an update time can also be used to evaluate the determination accuracy.

FIG. 580 is a diagram showing a specific example of the terminal posture information detected by the terminal posture detection unit 107, the movement direction information detected by the movement direction detection unit 108, and the placement state information detected by the placement state detection unit 109. In the example shown in FIG. 580, the target terminal has its bottom facing in the gravity direction (i.e. facing the ground) and its front facing the north, is placed in the user's breast pocket, and is moving toward the south.

Referring back to FIG. 576, the wireless strength measurement unit 110 measures a receiving electric field strength of a signal received by the wireless processing unit 104, for each base station. The wireless strength measurement unit 110 outputs the measured receiving electric field strength to the distance estimation unit 111 as receiving strength information associated with a base station ID identifying the base station.

The distance estimation unit 111 estimates a distance between each base station and the target terminal, based on the receiving strength information received from the wireless strength measurement unit 110 and transmitting strength information stored in the storage unit 114 beforehand. The distance estimation unit 111 outputs the estimated distance to the position estimation unit 112 and the correction unit 113, as distance information associated with a base station ID.

The above-mentioned transmitting strength information is stored in the storage unit 114 together with base station-related data used in the below-mentioned process. FIG. 581 is a diagram showing an example of base station management information 600. The base station management information 600 includes a set of base station ID records. Each base station ID record has items that are band information, transmitting strength, position information, and update time. The base station ID is ID information for uniquely specifying the corresponding base station. The band information indicates a frequency band used by the base station. The transmitting strength indicates radio wave transmission power of the base station. The position information indicates the coordinates (X, Y, and Z axes in a coordinate system) of the base station. The update time is used, for example, for comparison in order to record latest information when updating the base station management information 600.

FIG. 582 is a diagram showing a specific example of the receiving strength information measured by the wireless strength measurement unit 110 and the distance information estimated by the distance estimation unit 111. In the example shown in FIG. 582, the receiving electric field strengths of signals transmitted from base stations of base station IDs "AP-1", "AP-2", and "AP-3" are respectively "−49 dBm", "−60 dBm", and "−54 dBm", and the estimated distances are respectively "5 m", "15 m", and "10 m".

Referring back to FIG. 576, the position estimation unit 112 estimates the position (X, Y, and Z axes) of the target terminal, based on the base station position information stored in the storage unit 114 and the distance information received from the distance estimation unit 111. The position estimation unit 112 outputs the estimated position of the target terminal to the correction unit 113 as provisional position information.

The position estimation unit 112 also has a function of estimating the current position of the target terminal based on corrected distance information received from the correction unit 113 described later and the base station position information.

Once the position information of at least three base stations and the distances from these base stations are obtained, the position estimation unit 112 can estimate the position of the target terminal.

The correction unit 113 corrects the distance information received from the distance estimation unit 111, based on the terminal posture information, the movement direction information, and the placement state information received from the terminal information detection unit 106, the provisional position information received from the position estimation unit 112, and the above-mentioned base station information. The correction unit 113 outputs the corrected distance information as a result of the correction, to the position estimation unit 112.

The correction performed by the correction unit 113 on the distance information received from the distance estimation unit 112 is described in detail below.

The relationship between the terminal posture with respect to the base station and the receiving sensitivity is described first. The terminal posture with respect to the base station is posture information indicating which side of the target terminal faces the base station.

FIG. 583 is a diagram for describing the terminal posture with respect to the base station. For example in such a terminal shape in which the front has a wide area, the following applies to most wireless terminals, though dependent on the antenna structure in the wireless terminal: the receiving electric field strength of the signal transmitted from the base station varies depending on the terminal posture with respect to the base station due to an influence of antenna arrangement or antenna directivity in the wireless terminal, even when the wireless terminal is at the same position.

Typically, in the case where the terminal posture of the wireless terminal with respect to the base station is other than "front" as compared with the case where the terminal posture of the wireless terminal with respect to the base station is "front", the receiving electric field strength is measured at a lower level, as a result of which the distance between the base station and the wireless terminal is estimated to be longer.

For example, in FIG. 583, a base station "AP-4" is situated to the right of a wireless terminal "Mobile-2", whereas a base station "AP-5" is situated in front of the wireless terminal "Mobile-2". Even when actually the distance between the base station "AP-4" and the wireless terminal "Mobile-2" and the distance between the base station "AP-5" and the wireless terminal "Mobile-2" are equal and the base station "AP-4" and the base station "AP-5" have the same transmitting strength, the receiving strength of the signal received by the wireless terminal is different, and the base station "AP-4" is estimated to be farther and the base station "AP-5" is estimated to be closer.

The position estimation device 100 according to this embodiment calculates the terminal posture of the target terminal with respect to the base station by the below-mentioned process, and corrects the distance information by referencing to a table 900 exemplified in FIG. 584. The table 900 indicates the terminal posture with respect to the base station and a correction factor corresponding to the terminal posture, and is stored in the storage unit 114 beforehand.

The relationship between the positional relationship of the base station, the wireless terminal, and the user and the receiving strength is described next.

FIG. 585 is a diagram for describing the positional relationship of the base station, the wireless terminal, and the user. In the positional relationship of the base station, the wireless terminal, and the user, if the user (human body) is present between the base station and the wireless terminal, the wireless terminal receives a wireless signal which has been attenuated not only by the distance from the base station but also by the human body interference, and so the receiving electric field strength is measured at a lower level. As a result, the distance between the base station and the wireless terminal is estimated to be longer than the actual distance.

For example, in FIG. 585, a user (human body) is not present between a base station "AP-6" and a wireless terminal "Mobile-3", whereas a user (human body) is present between a base station "AP-7" and the wireless terminal "Mobile-3". Even when actually the distance between the base station "AP-6" and the wireless terminal "Mobile-3" and the distance between the base station "AP-7" and the wireless terminal "Mobile-3" are equal and the base station "AP-6" and the base station "AP-7" have the same transmitting strength, the receiving strength of the signal received by the wireless terminal is different, and the base station "AP-7" is estimated to be farther than the base station "AP-6".

The influence of the human body interference on the receiving strength varies depending on the frequency band used by the base station. A higher frequency causes an increase in straightness and a decrease in transmittance. Accordingly, the influence of the human body interference is greater when the base station uses a higher frequency band.

The position estimation device 100 according to this embodiment calculates the positional relationship of the base station, the wireless terminal, and the user by the below-mentioned process, and corrects the distance information by referencing to a table 1100 exemplified in FIG. 586. The table 1100 indicates the positional relationship of the base station, the wireless terminal, and the user and a correction factor corresponding to the positional relationship, and is stored in the storage unit 114 beforehand.

Note that, even when the positional relationship of the base station, the wireless terminal, and the user is the same, the influence of the human body interference on the receiving strength varies depending on the placement state of the wireless terminal (e.g. whether the wireless terminal is placed in a breast pocket or a pants pocket). Therefore, the influence of the human body interference may be classified into a plurality of levels depending on the positional relationship and the placement state so that the distance information is corrected according to the level.

Referring back to FIG. 581, the storage unit 114 stores the model pattern information 400 of terminal placement state information and the base station management information 600. The storage unit 114 also stores the table 900 in FIG. 584 indicating the correspondence between the terminal posture with respect to the base station and the correction factor, and the table 1100 in FIG. 586 indicating the correspondence between the positional relationship of the base station, the terminal, and the user and the correction factor.

(1-2. Operation)

The following describes operations of the position estimation device 100 according to this embodiment.

FIG. 587 is a flowchart showing an overall operation of the position estimation device 100 according to this embodiment. As shown in FIG. 587, the operation of the position estimation device 100 includes: a step of obtaining acceleration information and direction information and detecting terminal information (placement state, movement direction, and terminal posture) (Step S1201); a step of estimating distance information indicating the distance between the base station and the target terminal (Step S1202); a step of estimating provisional position information indicating the provisional position of the target terminal (Step S1203); a step of correcting the distance estimated in Step S1202 to calculate corrected distance information (Step S1204); a step of estimating current position information indicating the current position of the target terminal based on the corrected distance information (Step S1205); and a step of determining whether or not the current position information needs to be re-estimated (Step S1206).

FIG. 588 is a flowchart showing the terminal information detection operation in Step S1201 in detail. As shown in FIG. 588, the position estimation device 100 first determines whether or not the target terminal is moving from the time of previous position estimation, based on the output of the acceleration sensor 102. In the case where the target terminal is moving, the position estimation device 100 proceeds to the next step (Step S1301).

In the case where the target terminal is not moving from the previous position estimation, the position estimation device 100 sets the position information estimated at the previous estimation as the current position information, and returns to Step S1201 and waits for the next estimation.

The terminal posture detection unit 107 calculates the terminal posture information, based on the acceleration information received from the acceleration sensor 102 and the direction information received from the direction sensor 103 (Steps S1302, S1303, S1304).

The movement direction detection unit 108 detects the movement direction, based on the acceleration information received from the acceleration sensor 102 and the direction information received from the direction sensor 103 (Step S1305).

The placement state detection unit 109 detects the placement state, based on the pattern of the acceleration information received from the acceleration sensor 102 and the model pattern of acceleration information in each placement state stored in the storage unit 114 beforehand (Step S1306).

As a result of the process shown in FIG. 588, the terminal information of the target terminal shown in FIG. 580 is obtained.

FIG. 589 is a flowchart showing the distance information estimation operation in Step S1202 in detail. As shown in FIG. 589, first the wireless strength measurement unit 110 measures a receiving electric field strength of a signal transmitted from each of a plurality of base stations, and outputs receiving strength information indicating the measured receiving electric field strength in association with a base station ID of the base station, to the distance estimation unit 111 (Step S1401).

Next, the distance estimation unit 111 selects the base stations measured by the wireless strength measurement unit 110 in sequence, in decreasing order of receiving electric field strength (Step S1402).

The distance estimation unit 111 determines whether or not base station position information corresponding to a base station ID of the selected base station is stored in the storage unit 114 (Step S1403). In the case where the position information of the selected base station is stored in the storage unit 114, the position estimation device 100 proceeds to Step S1404. In the case where the position information of the selected base station is not stored in the storage unit 114, the position estimation device 100 returns to Step S1402.

The distance estimation unit 111 estimates the distance from the selected base station to the target terminal based on the receiving strength of the signal from the selected base station, and outputs the estimated distance to the position estimation unit 112 and the correction unit 113 in association with the base station ID (Step S1404).

After Step S1404, the distance estimation unit 111 determines whether or not the distance information from the necessary number of base stations for estimating the position of the target terminal, i.e. three or more base stations, can be estimated (Step S1405). In the case where three or more pieces of distance information can be estimated, the position estimation device 100 ends the distance information estimation process, and proceeds to Step S1203. In the case where three or more pieces of distance information cannot be estimated, the position estimation device 100 returns to Step S1402.

In the case where three pieces of distance information cannot be estimated even after all base stations measured by the wireless strength measurement unit 110 are selected in Step S1402, the position information of the target terminal cannot be estimated, and accordingly the position estimation device 100 returns to Step S1201 and waits for the next position estimation.

As a result of the process shown in FIG. 589, the distance from each base station to the target terminal is estimated.

Referring back to FIG. 587, the process of estimating the provisional position of the target terminal in Step S1203 is described below. For example, suppose the receiving strengths of the signals from the three base stations "AP-1", "AP-2", and "AP-3" are measured and the distances from the base stations "AP-1", "AP-2", and "AP-3" to the target terminal are estimated respectively as L1, L2, and L3 in Step S1202. This being the case, an intersection point of: a circle with radius L1 and center at the base station "AP-1"; a circle with radius L2 and center at the base station "AP-2"; and a circle with radius L3 and center at the base station "AP-3" is estimated as the provisional position of the target terminal as shown in FIG. 578, and provisional position information indicating the provisional position is outputted to the correction unit 113.

Though the above description is based on an assumption that the Z coordinate is the same (fixed), there are two intersection points of the three spherical surfaces when the Z coordinate is taken into consideration. In such a case, the intersection points may be narrowed down to one point by a method such as using the fourth distance information or defining a reference height of the target terminal beforehand.

FIG. 590 is a flowchart showing the distance information correction operation in Step S1204 in detail. First, the correction unit 113 selects the base stations used by the position estimation unit 112 for position estimation, in sequence (Step S1501).

The correction unit 113 calculates the terminal posture of the target terminal with respect to the base station selected in Step S1501 (Step S1502). In this embodiment, the correction unit 113 first calculates the direction from the target terminal to the selected base station, based on the provisional position information received from the position estimation unit 112 and the position information of the base station stored in the storage unit 114.

The correction unit 113 calculates the terminal posture of the target terminal with respect to the selected base station, from the calculated direction from the target terminal to the selected base station and the terminal posture received from the terminal information detection unit 106.

FIG. 591 is a diagram showing an example of the result of calculating the direction from the target terminal to the selected base station and an example of the result of calculating the terminal posture of the target terminal with respect to the base station. In FIG. 591, the directions from the target terminal to the base stations "AP-1", "AP-2", and "AP-3" are respectively calculated as "north", "south", and "east", and the terminal postures of the target terminal with respect to the base stations "AP-1", "AP-2", and "AP-3" are respectively calculated as "front", "back", and "right".

After calculating the terminal posture of the target terminal with respect to the base station, the correction unit 113 calculates the correction factor, by referencing to the table 900 stored in the storage unit 114 and indicating the correspondence between the terminal posture with respect to the base station and the correction factor (Step S1503).

The correction unit 113 then determines whether or not the user is present between the base station and the target terminal, in the positional relationship of the base station selected in Step S1501, the target terminal, and the user (Step S1504).

The process of calculating the positional relationship of the base station, the target terminal, and the user is described below. First, the correction unit 113 determines whether the target terminal is placed on the front side or the back side of the user, from the placement state received from the terminal information detection unit 106. In this embodiment, the correction unit 113 determines that the target terminal is placed on the front side of the user in the case where the placement state is a breast pocket or a front pants pocket, and that the target terminal is placed on the back side of the user in the case where the placement state is a back pants pocket.

Next, the correction unit 113 specifies the direction (facing direction) in which the user faces. Since the movement direction of the target terminal received from the terminal information detection unit 106 indicates the movement direction of the user, the correction unit 113 sets the movement direction of the target terminal directly as the facing direction of the user in this embodiment.

In the case where the direction from the target terminal to the selected base station calculated in Step S1502 and the facing direction of the user are the same and the target terminal is placed on the front side of the user and in the case where the direction from the target terminal to the selected base station calculated in Step S1502 and the facing direction of the user are opposite and the target terminal is placed on the back side of the user, the correction unit 113 determines that the user is not present between the base station and the target terminal.

FIG. 592 is a diagram showing an example of the result of determining whether or not the user is present between the base station and the target terminal. In FIG. 592, the user is not present between each of the base stations "AP-1" and "AP-3" and the target terminal, whereas the user is present between the base station "AP-2" and the target terminal.

As mentioned earlier, even when the positional relationship of the base station, the wireless terminal, and the user is the same, the influence of the human body interference on the receiving strength varies depending on the placement state of the wireless terminal. Therefore, a table indicating not the presence/absence of human body interference but the degree of human body interference in a plurality of levels may be created according to the positional relationship and the placement state so that the correction amount is changed depending on the placement state.

In the case where the user is present between the base station and the target terminal, the correction unit 113 calculates the correction factor, by referencing to the table 1100 stored in the storage unit 114 and indicating the correspondence between the positional relationship of the base station, the target terminal, and the user and the correction factor (Step S1505).

After Step S1505, the correction unit 113 corrects the distance information received from the distance estimation unit 111 by multiplication by the correction factor calculated in Step S1503 and the correction factor calculated in Step S1505 (Step S1506).

The correction unit 113 determines whether or not all base stations used for the position estimation are selected in Step S1501. In the case where all base stations are selected, the position estimation device 100 proceeds to Step S1205. Otherwise, the position estimation device 100 returns to Step S1501 (Step S1507).

Referring back to FIG. 587, the process in Step S1205 is described below. In Step S1205, the position estimation unit 112 estimates the current position of the target terminal based on the corrected distance information received from the correction unit 113 and the base station position information stored in the storage unit 114. Here, the current position of the target terminal is estimated by performing the same process as Step S1203 using the corrected distance information instead of the distance information received from the distance estimation unit 111. FIG. 593 is a diagram showing an example of the current position estimated using the corrected distance information. In FIG. 593, the distances from the base stations "AP-1", "AP-2", and "AP-3" to the target terminal are respectively corrected to L1', L2', and L3' by the correction unit 113, and the current position information is estimated at a position of distance L away from the provisional position of the target terminal estimated in Step S1203.

In Step S1206, the position estimation unit 112 determines whether or not the current position information estimated in Step S1205 needs to be re-estimated. The position estimation unit 112 compares the provisional position information estimated in Step S1203 and the current position information estimated in Step S1205. In the case where the distance L between the two positions is equal to or more than a predetermined threshold (e.g. 3 m), the position estimation unit 112 determines that the current position information needs to be re-estimated, sets the current position information estimated in Step S1205 as provisional position information, and returns to Step S1204. In the case where the difference of the distance between the two positions is less than the predetermined threshold, the position estimation unit 112 sets the current position information estimated in Step S1205 as the final position estimation result, and ends the process.

(1-3. Conclusion)

The position estimation device 100 according to this embodiment corrects the distance information estimated from the receiving electric field strength of the signal from each base station, according to the terminal posture of the target terminal with respect to the base station and the positional relationship of the base station, the target terminal, and the user.

With this structure, even in a situation where, due to the influence of the terminal posture or the positional relationship, the receiving electric field strength decreases and so the distance between the base station and the target terminal is estimated to be longer than the actual distance, the distance between the base station and the target terminal can be calculated with higher accuracy, as a result of which the position of the target terminal can be estimated more accurately.

[Embodiment E2]

The following describes a position estimation device 1900 according to an embodiment of the present invention. In Embodiment E1, the distance between the base station and the target terminal is estimated from the receiving electric field strength of the signal transmitted from the base station, and the current position of the target terminal is estimated using the distance from each base station whose position information is known. Embodiment E2 differs from Embodiment E1 in that the position estimation is performed using an electric field strength map in which the receiving electric field strength of the signal receivable from each base station is recorded for each position at predetermined space intervals. The same components as those in Embodiment E1 are given the same reference signs, and their description is omitted.

(2-1. Structure)

FIG. 594 is a block diagram showing a structure of the position estimation device 1900 according to Embodiment E2. As shown in FIG. 594, the position estimation device 1900 has a structure in which a control unit 1901, a position estimation unit 1902, a correction unit 1903, and a storage unit 1904 are included instead of the control unit 105, the position estimation unit 112, the correction unit 113, and the storage unit 114 and the distance estimation unit 111 is omitted, as compared with the structure of the position estimation device 100 in Embodiment E1.

The position estimation unit 1902 estimates provisional position information indicating the provisional position of the target terminal, using the receiving strength information received from the wireless strength measurement unit 110 and the electric field strength map stored in the storage unit 1904 beforehand. The position estimation unit 112 outputs the estimated provisional position information to the correction unit 1903.

The position estimation unit 112 also has a function of estimating the current position of the target terminal based on corrected strength information received from the correction unit 1903 described later and the electric field strength map.

FIG. 595 is a diagram showing a specific example of an electric field strength map 2000. As shown in FIG. 595, for each position at predetermined space intervals, the receiving electric field strength of the signal receivable from each base station is recorded in the electric field strength map 2000. The current position of the target terminal can be estimated by referencing to the electric field strength map 2000 using the receiving electric field strength of each base station.

Referring back to FIG. 594, the correction unit 1903 corrects the receiving strength information received from the wireless strength measurement unit 110, based on the terminal posture information, the movement direction information, and the placement state information received from the terminal information detection unit 106, the provisional position information received from the position estimation unit 1902, and the base station position information. The correction unit 1903 outputs the corrected strength information as a result of the correction, to the position estimation unit 1902. While the correction factor is set so as to decrease the distance in Embodiment E1, the correction factor is set so as to increase the receiving strength in this embodiment.

The storage unit 1904 stores the model pattern information 400 of each placement state in FIG. 579, the base station management information 600 in FIG. 581, and the electric field strength map 2000 in FIG. 595. The storage unit 1904 also stores the table indicating the correspondence between the terminal posture with respect to the base station and the correction factor, and the table indicating the correspondence between the positional relationship of the base station, the terminal, and the user and the correction factor.

(2-2. Operation)

The following describes operations of the position estimation device 1900 according to this embodiment. FIG. 596 is a flowchart showing an overall operation of the position estimation device 1900 according to this embodiment.

As shown in FIG. 596, the operation of the position estimation device 1900 includes: a step of obtaining acceleration information and direction information and detecting terminal information (placement state, movement direction, and terminal posture) (Step S1201); a step of measuring the receiving strength of the signal transmitted from the base station (Step S2101); a step of estimating provisional position information indicating the provisional position of the target terminal (Step S2102); a step of correcting the receiving strength measured in Step S2101 to calculate corrected strength information (Step S2103); a step of estimating current position information indicating the current position of the target terminal based on the corrected strength information (Step S2104); and a step of determining whether or not the current position information needs to be re-estimated (Step S1206).

Step S1201 has the same process as in Embodiment E1, and so its description is omitted.

In Step S2101, the wireless strength measurement unit 110 measures the receiving electric field strength of the signal transmitted from each of a plurality of base stations, and outputs receiving strength information indicating the measured receiving electric field strength in association with a base station ID, to the position estimation unit 1902 and the correction unit 1903.

In Step S2102, the position estimation unit 1902 estimates provisional position information indicating the provisional position of the target terminal based on the receiving strength information received from the wireless strength measurement unit 110 and the electric field strength map stored in the storage unit 1904, and outputs the provisional position information to the correction unit 1903.

FIG. 597 is a flowchart showing the receiving strength information correction operation in Step S2103 in detail. First, the correction unit 1903 selects the base stations measured by the wireless strength measurement unit 110, in sequence (Step S2201).

The correction unit 1903 calculates the terminal posture of the target terminal with respect to the base station selected in Step S2201 (Step S2202). The process of calculating the terminal posture of the target terminal with respect to the base station is the same as Step S1502 in Embodiment E1.

After calculating the terminal posture of the target terminal with respect to the base station, the correction unit 1903 calculates the correction factor, by referencing to the table stored in the storage unit 1904 and indicating the correspondence between the terminal posture with respect to the base station and the correction factor (Step S2203).

The correction unit 1903 then determines whether or not the user is present between the base station and the target terminal, in the positional relationship of the base station selected in Step S2201, the target terminal, and the user (Step S2204). The process of determining whether or not the user is present between the base station and the target terminal in the positional relationship of the base station, the target terminal, and the user is the same as Step S1504 in Embodiment E1.

In the case where the user is present between the base station and the target terminal, the correction unit 1903 calculates the correction factor, by referencing to the table stored in the storage unit 1904 and indicating the correspondence between the positional relationship of the base station, the target terminal, and the user and the correction factor (Step S2205).

After Step S2205, the correction unit 1903 corrects the receiving strength information received from the wireless strength measurement unit 110 by multiplication by the correction factor calculated in Step S2203 and the correction factor calculated in Step S2205 (Step S2206).

The correction unit 1903 determines whether or not all base stations measured by the wireless strength measurement unit 111 are selected. In the case where all base stations are selected, the position estimation device 1900 proceeds to Step S2104. Otherwise, the position estimation device 1900 returns to Step S2201 (Step S2207).

Referring back to FIG. 596, the process in Step S2104 is described below. In Step S2104, the position estimation unit 1902 estimates the current position of the target terminal based on the corrected strength information received from the correction unit 1903 and the electric field strength map stored in the storage unit 114.

In Step S2105, the position estimation unit 1902 determines whether or not the current position information estimated in Step S2104 needs to be re-estimated. The position estimation unit 1902 compares the provisional position information estimated in Step S2102 and the current position information estimated in Step S2104. In the case where the distance L between the two positions is equal to or more than a predetermined threshold (e.g. 3 m), the position estimation unit 1902 determines that the current position information needs to be re-estimated, sets the current position information estimated in Step S2104 as provisional position information, and returns to Step S2103. In the case where the difference of the distance between the two positions is less than the predetermined threshold, the position estimation unit 1902 sets the current position information estimated in Step S2104 as the final position estimation result, and ends the process.

(2-3. Conclusion)

The position estimation device 1900 according to this embodiment estimates the position of the target terminal by referencing to the electric field strength map using the receiving electric field strength of the signal from each base station.

With this structure, the process required for distance information calculation and the time required for position information calculation can be reduced. This enables position estimation to be performed at high speed, as compared with the position estimation device in Embodiment E1.

(3-1. Supplementary Notes)

Though each exemplary embodiment of the position estimation device according to an aspect of the present invention has been described above, the present invention is not limited to this embodiment. The exemplified position estimation device may be modified as below.

(1) In the above-described embodiments, the base station management information 600 shown in FIG. 581 is stored in the storage unit beforehand. However, the present invention is not limited to this.

For example, the base station management information 600 may be stored in an external storage device, from which the target terminal obtains the base station management information through communication as necessary.

(2) In the above-described embodiments, the distance information or the receiving strength information is corrected by multiplying it by the correction factor. However, the method of correcting the distance information or the receiving strength information is not limited to such. For example, the distance information or the receiving strength information may be corrected by addition or subtraction using a table indicating the corresponding amount of correction.

(3) The above-described embodiments and variations may be partially combined.

(4) It is also possible to record on recording media or distribute via various communication paths and so on a control program including program codes which are written in a machine language or a high-level language to cause a processor of the position estimation device and various circuits connected to the processor to execute the distance estimation, correction, and other processes described in each of the above embodiments. Examples of the recording media include IC cards, hard disks, optical discs, flexible disks, ROMs, and flash memories. The distributed control program is provided for use by being stored in a memory and the like which can be read by the processor. As the processor executes the control program, each function described in each of the above embodiments is implemented. It is to be noted that rather than by directly executing the control program, the processor may execute the control program through compilation or by using an interpreter.

(5) Each functional structural element described in each of the above embodiments may be realized as a circuit which executes the function of the functional structural element or realized through execution of a program by one or more processors. Furthermore, the position estimation device according to an aspect of the present invention may be provided as a package of an integrated circuit such as IC and LSI. This package is incorporated into various devices for use, which allows the various devices to perform each function described in the embodiment.

It is to be noted that each functional block such as the distance estimation unit, the position estimation unit, and the correction unit is typically realized in the form of an LSI that is an integrated circuit. These LSIs may be manufactured as individual chips, or some or all of the LSIs may be integrated into one chip. Although the name used here is LSI, it is also called IC, system LSI, super LSI, or ultra LSI depending on the degree of integration. Furthermore, the means for circuit integration is not limited to the LSI, and a dedicated circuit and a general-purpose processor are also available. It is also acceptable to use: a field programmable gate array (FPGA) that is programmable after the LSI has been manufactured; and a reconfigurable processor in which connections and settings of circuit cells within the LSI are reconfigurable. Furthermore, if circuit integration technology that replaces LSI appears through progress in the semiconductor technology or other derivative technology, that circuit integration technology can be used for the integration of the functional blocks. Adaptation and so on of biotechnology is one such possibility.

(3-2. Supplementary Notes 2)

The following describes a structure of a position estimation device according to an aspect of the present invention and its variations and advantageous effects.

(a) A position estimation device according to an aspect of the present invention is a position estimation device that estimates a current position of a wireless terminal, the position estimation device including: a detection unit that detects acceleration information and direction information of the wireless terminal; a distance estimation unit that estimates, using a receiving strength of a signal received from each of a plurality of base stations, distance information indicating a distance from the base station; a position estimation unit that estimates provisional position information indicating a provisional position of the wireless terminal, using base station information indicating a position of the base station and the distance information; and a correction unit that corrects the distance information using the acceleration information, the direction information, the base station information, and the provisional position information, wherein the position estimation unit further estimates current position information indicating the current position of the wireless terminal, using the base station information and the corrected distance information.

(b) The position estimation device according to the above (a) may further include a terminal posture detection unit that detects posture information of the wireless terminal using the acceleration information and the direction information, wherein the correction unit corrects the distance information according to the base station information, the provisional position information, and the posture information.

With the structures of the above (a) and (b), the terminal posture of the wireless terminal is calculated based on the acceleration information and the direction information, and the distance information is corrected according to the terminal posture. The accuracy of the distance information from the base station can be improved in this way. By using the accurate distance information for the position estimation, the position estimation device according to the present invention can equally improve the accuracy of the estimated position information.

(c) The position estimation device according to the above (a) may further include: a placement information detection unit that determines placement information indicating at which part of a user the wireless terminal is placed, using the acceleration information; and a movement direction detection unit that detects a movement direction of the wireless terminal using the acceleration information and the direction information, wherein the correction unit specifies a positional relationship of the base station, the user, and the wireless terminal using the base station information, the provisional position information, the placement information, and the movement direction, and corrects the distance information according to the positional relationship.

With this structure, whether or not the user (human body) is present between the base station and the wireless terminal can be determined, with it being possible to correct the distance information according to signal attenuation caused by human body interference.

(d) In the position estimation device according to the above (c), the correction unit may correct the distance information according to the positional relationship and a frequency band used by the base station.

With this structure, regarding wireless signal attenuation that varies depending on frequency characteristics such as straightness and transmittance, the distance information corrected according to the frequency band used by the base station can be estimated.

(e) A position estimation device according to an aspect of the present invention is a position estimation device that estimates a current position of a wireless terminal, the position estimation device including: a detection unit that detects acceleration information and direction information of the wireless terminal; a measurement unit that measures a receiving strength of a signal transmitted from each of a plurality of base stations; a storage unit that stores an electric field strength map recording, for each position at predetermined space intervals, a receiving strength of a signal received from each base station; a position estimation unit that estimates provisional position information indicating a provisional position of the wireless terminal, using the receiving strength and the electric field strength map; and a correction unit that corrects the receiving strength using the acceleration information, the direction information, and the provisional position information, wherein the position estimation unit further estimates current position information indicating the current position of the wireless terminal, using the corrected receiving strength and the electric field strength map.

With this structure, the terminal posture of the wireless terminal is calculated based on the acceleration information and the direction information, and the receiving strength is corrected according to the terminal posture. The accuracy of the receiving strength from the base station can be improved in this way. By using the accurate receiving strength for the position estimation, the position estimation device according to the present invention can equally improve the accuracy of the estimated position information.

Moreover, with this structure, the position estimation is performed using the wireless strength map. This reduces processing time required for distance estimation and position estimation, contributing to faster position estimation.

[Embodiment F]

Embodiment F of the present invention describes a position estimation device which, when there are few base stations whose positions are known in advance, increases the accuracy of the position estimation without requiring addition of a special positioning device.

Hereinafter, Embodiment F of the present invention will be described using the drawings. A position estimation device 100 according to the present invention, for example, is included in a wireless terminal such as a mobile phone, and has a function to estimate a current position of the wireless terminal (hereinafter referred to as "target terminal").

<1. Configuration>

FIG. 598 is a block diagram showing a configuration of the position estimation device 100 according to Embodiment F. As shown in FIG. 598, the position estimation device 100 includes a sensor unit 101, a wireless processing unit 105, a control unit 106, and a storage unit 119. The sensor unit 101 includes an acceleration sensor 102, an angular velocity sensor 103, and a geomagnetic sensor 104. The control unit 106 includes a terminal information calculation unit 107, an autonomous navigation position estimation unit 110, a wireless strength measurement unit 111, a distance estimation unit 112, an RSSI position estimation unit 113, a provisional position setting unit 114, a communication mode change instruction unit 115, a transmission and reception control unit 116, a possible area calculation unit 117, and a correction unit 118. The terminal information calculation unit 107 includes an orientation change amount calculation unit 108 and a terminal movement amount calculation unit 109.

The acceleration sensor 102 detects the acceleration of the target terminal in three axial directions, converts the detected acceleration into an electrical signal, and outputs the electrical signal to the terminal information calculation unit 107 as acceleration information.

The angular velocity sensor 103 detects the angular velocity of the target terminal in the three axial directions, converts the detected angular velocity into an electrical signal, and outputs the electrical signal to the terminal information calculation unit 107 as angular velocity information.

The geomagnetic sensor 104 detects the geomagnetism in the three axial directions, converts the detected geomagnetism into an electrical signal, and outputs the electrical signal to the terminal information calculation unit 107 as geomagnetism information.

The wireless processing unit 105 includes an antenna or the like, and has a function to transmit and receive a wireless signal to communicate with other wireless stations. Here, wireless stations refer to devices with a function to wirelessly communicate with other wireless stations. Examples of the wireless stations include a base station such as a master station of a mobile phone and a wireless LAN access point, a mobile station such as a mobile phone and a PHS, and a fixed station which is fixed in position such as a television receiver with a wireless function.

The orientation change amount calculation unit 108 calculates, based on the angular velocity information received from the sensor unit 101, an orientation change amount that is an amount of change in orientation from the previous position estimation, and outputs the calculated orientation change amount to the autonomous navigation position estimation unit 110. In the present embodiment, the orientation change amount is an amount of change in the angles of the target terminal which are detected in the three axial directions by the angular velocity sensor, and is calculated by integrating the angular velocity information.

The terminal movement amount calculation unit 109 calculates, based on the acceleration information and the geomagnetism information received from the sensor unit 101, a movement amount of the target terminal that is an amount of movement of the target terminal from the previous position estimation, and outputs the calculated movement amount of the target terminal to the autonomous navigation position estimation unit 110. In the present embodiment, used as the movement amount from the previous position estimation is a distance calculated by integrating twice the acceleration in the X-axis direction (east-west direction), the acceleration in the Y-axis direction (south-north direction), and the acceleration in the Z-axis direction (height) in the geocentric orthogonal coordinate system, which are calculated using the acceleration information and the geomagnetism information.

The autonomous navigation position estimation unit 110 includes a clock unit not shown in FIG. 598, and has (1) a function to measure a time period which has elapsed from the previous position estimation, (2) a function to add, to the position information obtained from the previous position estimation, the movement amount of the target terminal received from the terminal information calculation unit 107, to calculate autonomous position information indicating a position estimated by autonomous navigation, and (3) a function to calculate autonomous position accuracy information indicating the accuracy of the above provisional position, using the orientation change amount and the movement amount of the target terminal that are received from the terminal information calculation unit 107 and the above-mentioned elapsed time period. The autonomous navigation position estimation unit 110 outputs the calculated autonomous navigation position information and autonomous navigation accuracy information to the provisional position setting unit 114.

Here, the autonomous navigation accuracy information will be described. The input from the sensor unit contains a certain amount of error. In general, the more rapid the change is in the values detected (acceleration, angular velocity, and geomagnetic direction), the larger the error is. Furthermore, the error is generally accumulated with time.

In view of the above problem, the autonomous navigation position estimation unit 110 calculates, as the autonomous navigation accuracy information, a value which decreases with increase in each of the values of the orientation change amount of the target terminal, the movement amount of the target terminal, and the time period which has elapsed from the previous position estimation. In the present embodiment, the autonomous navigation position estimation unit 110 calculates, as the autonomous navigation accuracy information, (i) a value obtained by subtracting from 100 a quotient obtained by dividing the total three-axial orientation change amount of the target terminal in the directions by a predetermined threshold Tangle [rad] (e.g., $\pi/18$ [rad]), (ii) a value obtained by subtracting from 100 a quotient obtained by dividing the total three-axial movement amount of the target terminal by a predetermined threshold Tdistance [m] (e.g., 100 [mm]), and (iii) a value obtained by subtracting from 100 a quotient obtained by dividing the time period which has elapsed from the previous measurement by a predetermined threshold Ttime [s] (e.g., 100 [ms]), for example.

The wireless strength measurement unit 111 measures for each wireless station the receiving field strength of the signal received by the wireless processing unit 105. The wireless strength measurement unit 111 outputs the measured receiving field strength to the distance estimation unit 112 as receiving strength information associated with a wireless station ID which identifies a corresponding wireless station.

The distance estimation unit 112 calculates an estimated distance to each wireless station and its accuracy using the receiving strength information received from the wireless strength measurement unit 111, and outputs each estimated distance and its accuracy associated with a wireless station ID to the RSSI position estimation unit 113 and the possible area calculation unit 117 as estimated distance information and distance accuracy information.

Here, when the storage unit 119 stores transmission output of the wireless station targeted for the distance estimation, the distance estimation unit 112 calculates the estimated distance information and the distance accuracy information using the transmission output.

The transmission output of the base station among the wireless stations is stored in advance in the storage unit 119 together with data which is related to the base station and is to be used in processing described later. FIG. 599 is an example of base station management information 200. The base station management information 200 includes a set of base station ID records, and each base station ID record includes items of transmission output and position information. Here, each base station ID is ID information uniquely identifying a base station. The transmission output indicates the transmission power of radio waves of each base station, and the position information indicates the coordinates (latitude, longitude, and height) of each base station according to the geocentric orthogonal coordinate system.

Furthermore, the distance estimation unit 112 also calculates the estimated distance information and the distance accuracy information using the transmission output received from the transmission and reception control unit 116, when the distance estimation unit 112 has been able to obtain, through communication with another wireless station, the transmission output of the wireless station targeted for the distance estimation.

Here, the above-mentioned distance accuracy information will be described. FIG. 600 is a diagram showing a relationship between wireless receiving field strength and distance. As shown in FIG. 600, the receiving field strength changes more significantly with decrease in the distance between the wireless station which has transmitted a signal and the wireless station which has received the signal. Thus, the greater the receiving field strength is, the more accurate the estimated distance information is. Accordingly, the distance estimation unit 112 calculates the distance accuracy information which increases in value with increase in the receiving strength.

FIG. 601 is an example of the estimated distance information and the distance accuracy information estimated and calculated by the distance estimation unit 112. FIG. 601 shows that the estimated distance information on wireless stations "AP-1", "Mobile-2", and "TV-1" are "3 m", "9 m", and "5 m", respectively, and their distance accuracy are "90", "60", and "80", respectively.

Referring back to FIG. 598, the following continues with the description of each structural element. Based on (i) the estimated distance information indicating the distances from the base stations and the distance accuracy information indicating the accuracy of that estimated distance information among the estimated distance information and the distance accuracy information received from the distance estimation unit 112 and (ii) the position information on the base stations stored in the storage unit 119, the RSSI position estimation unit 113 estimates RSSI position information indicating a position estimated based on the receiving field strength of the target terminal and calculates RSSI accuracy information indicating the accuracy of the RSSI position information, and outputs the RSSI position information and the RSSI accuracy information to the provisional position setting unit 114. The RSSI accuracy information in the present embodiment is, for example, the average value of the distance accuracy information of the estimated distance information used in estimating the RSSI position information.

The RSSI position information estimated by the RSSI position estimation unit 113 will be described. For example, suppose that the RSSI position estimation unit 113 has received from the distance estimation unit 112 the distance information "L1", "L2", and "L3" indicating the distances from three base stations "AP-1", "AP-2", and "AP-3", respectively, and that the respective position information (X1, Y1, X1), (X2, Y2, Z2), and (X3, Y3, Z3) on the base stations "AP-1", "AP-2", and "AP-3" are stored in the storage unit 119. The RSSI position estimation unit 113 estimates, as the RSSI position information, intersections of the spherical surface of a circle having a radius L1 centering on the base station "AP-1" ($(X-X1)^2+(Y-Y1)^2+(Z-Z1)^2=L1^2$), the spherical surface of a circle having a radius L2 centering on the base station "AP-2" ($(X-X2)^2+(Y-Y2)^2+(Z-Z2)^2=L2^2$), and the spherical surface of a circle having a radius L3 centering on the base station "AP-3" ($(X-X3)^2+(Y-Y3)^2+(Z-Z3)^2=L3^2$). The above equations give two points as the RSSI position information; however, by, for example, using fourth distance information which fixes the Z-axis, the RSSI position information will be determined as one point.

The provisional position setting unit 114 calculates the provisional position information indicating the provisional position of the target terminal and provisional position accuracy information indicating the accuracy of the provisional position information based on the autonomous navigation position information and the autonomous navigation accuracy information received from the autonomous navigation position estimation unit 110 and the RSSI position information and the RSSI accuracy information received from the RSSI position estimation unit 113. The provisional position setting unit 114 outputs the calculated provisional position information and provisional position accuracy information to the correction unit 118. For example, the provisional position setting unit 114 calculates, as the provisional position information, a weighted average of the autonomous navigation position information and the RSSI position information using the autonomous navigation accuracy information and the RSSI accuracy information as weights, and calculates, as the provisional position accuracy information, an average value of the autonomous navigation accuracy information and the RSSI accuracy information.

It is to be noted that when the RSSI position estimation unit 113 cannot estimate the RSSI position information, the provisional position setting unit 114 outputs the autonomous navigation position information and the autonomous navigation accuracy information to the correction unit 118 as the provisional position information and the provisional position accuracy information.

FIG. 602 shows map information indicating the structure of a private space such as home and an example of placement of wireless stations in the map information. In general, there are plural wireless stations in a private space such as home, and the wireless terminals belong to the same network.

Referring back to FIG. 598, the communication mode change instruction unit 115 instructs the wireless stations that belong to the same network to temporarily change the communication mode. The communication mode change instruction unit 115, for example, instructs a mobile station or a fixed station to (i) behave like a wireless access point as in the tethering mode or the like, or (ii) be in a similar state in the ad hoc mode or the like. Receiving the signals transmitted by the wireless stations in response to the above instruction enables the position estimation device 100 to calculate the estimated distance information even for the wireless stations other than the base station.

It is to be noted that the communication mode change instruction may instruct the wireless stations to (i) make an instant response (transmit information held by the wireless stations before changing the communication mode) or (ii)

make a response after measurement is completed (transmit measured distance information and distance accuracy information when the wireless stations have a distance measuring function). In the case of the response after the measurement is completed, the target terminal can increase the accuracy of the distance information by using bidirectional distance information obtained by receiving the distance information indicating the distances from the wireless stations to the target terminal measured by the respective wireless stations. Furthermore, receiving the distance information which indicates the distances from the other wireless stations measured by the respective wireless stations enables the target terminal to obtain the distance information indicating relative distances between three wireless stations including the target terminal.

The transmission and reception control unit 116 communicates with the wireless stations that belong to the same network, and when each wireless station holds its transmission output or position information, obtains that transmission output or the position information. FIG. 603 is a specific example of wireless station information 600 in which the wireless station IDs and the obtained transmission output and position information are associated with each other. FIG. 603 shows that the transmission output of the wireless station "Mobile-2" and the position information on the wireless station "TV-1" have been obtained.

Furthermore, when the wireless stations that belong to the same network have, like the target terminal, a function to estimate the distances to the other wireless stations and hold the estimated distance information and the distance accuracy information, the transmission and reception control unit 116 obtains that estimated distance information and distance accuracy information. FIG. 604 is a specific example of other wireless station information 700 indicating the estimated distance information and the distance accuracy information held by the wireless stations. FIG. 604 shows that the wireless station "Mobile-2" holds the estimated distance information and the distance accuracy information on the wireless station "TV-1".

Referring back to FIG. 598, the transmission and reception control unit 116 outputs the obtained wireless station information 600 and other wireless station information 700 to the distance estimation unit 112 and the possible area calculation unit 117.

Next, the possible area calculation unit 117 will be described. The possible area calculation unit 117 calculates, based on the estimated distance information received from the distance estimation unit 112, a possible area indicating an area in the space indicated in the map information, in which the target terminal is likely to be present, and outputs the possible area to the correction unit.

FIG. 602 shows an example of the map information. As shown in FIG. 602, the map information includes the position of an obstacle which attenuates the signal transmitted by each wireless station. With the map information as shown in FIG. 602, the possible area calculation unit 117 calculates, as the possible area, an area in which the both ends of a line segment indicated by the estimated distance information are likely to be present.

Hereinafter, the method of calculating the possible area will be described in detail using the drawings. In the description, the target terminal targeted for the position estimation is shown with a circle as the wireless station ID "Mobile-1". Furthermore, the other wireless stations used in calculating the possible area are shown with triangles as the wireless station IDs "Mobile-2", "Mobile-3", and "TV-1".

FIG. 605 is a diagram for describing the method of calculating the possible area when no obstacle is present on the map indicated in the map information.

First, as shown in (a) in FIG. 605, the possible area calculation unit 117 fixes the wireless station "Mobile-2" at the bottom-left (south-west) corner among the four corners of the map, and measures the trajectory of the target terminal "Mobile-1" which is located apart by the distance indicated in the estimated distance information. The map can be partitioned into two areas by the trajectory of the target terminal "Mobile-1". Among the two areas, the area which does not include the map's bottom-left (south-west) corner at which the wireless station "Mobile-2" is fixed is (1) the possible area of the target terminal "Mobile-1" when the target terminal "Mobile-1" is positioned above (north of) and right to (east of) the wireless station "Mobile-2".

The possible area calculation unit 117 fixes the wireless station "Mobile-2" at the bottom-right (south-east) corner, the upper-left (north-west) corner, and the upper-right (north-east) corner among the four corners of the map, and performs the same processing to respectively calculate (2) the possible area of the target terminal "Mobile-1" when the target terminal "Mobile-1" is positioned above (north of) and left to (east of) the wireless station "Mobile-2", (3) the possible area of the target terminal "Mobile-1" when the target terminal "Mobile-1" is positioned below (south of) and right to (east of) the wireless station "Mobile-2", and (4) the possible area of the target terminal "Mobile-1" when the target terminal "Mobile-1" is positioned below (south of) and left to (west of) the wireless station "Mobile-2".

The possible area calculation unit 117 obtains a union of the calculated four possible areas to calculate the possible area of the target terminal "Mobile-1" when no obstacle is present on the map indicated in the map information. (b) in FIG. 605 shows an example of the result of calculation of the possible area of the target terminal "Mobile-1".

Next, the following describes the case where an obstacle is present on the map. As previously described, the map information in some cases includes an obstacle which attenuates a wireless signal. When the obstacle is present between the target terminal "Mobile-1" and the wireless station "Mobile-2" at the time of the calculation of the possible area, the possible area calculation unit 117 calculates the possible area using corrected distance information obtained by correcting the estimated distance information according to the type and number of obstacles.

FIG. 606 is an example of a table 900 of types of obstacles and correction scaling factors. When a "wall (thin)" is present between the target terminal "Mobile-1" and the wireless station "Mobile-2", for example, the possible area calculation unit 117 calculates the possible area using the corrected distance information obtained by multiplying the estimated distance information by a correction scaling factor 0.9. Furthermore, when two obstacles, a "wall (thin)" and a "wall (thick)", are present between the target terminal "Mobile-1" and the wireless station "Mobile-2", the possible area calculation unit 117 calculates the possible area using the corrected distance information obtained by multiplying the estimated distance information by a correction scaling factor $0.9\times0.8=0.72$.

FIG. 607 is a diagram for describing the method of calculating the possible area when an obstacle is present on the map shown in the map information.

First, as shown in (a) in FIG. 607, the possible area calculation unit 117 fixes the wireless station "Mobile-2" at the bottom-left (south-west) corner among the four corners of the map, and measures the trajectory of the target terminal "Mobile-1". In doing so, as the distance between the target terminal "Mobile-1" and the wireless station "Mobile-2", the estimated distance information is used when no obstacle is present in between, and the corrected distance information obtained by correcting the estimated distance information according to the type and number of obstacles is used when an obstacle is present in between. The discontinuous points generated by the use of the two types of distance information are connected by a straight line which is used as the trajectory of the target terminal "Mobile-1".

The map can be partitioned into two areas by the trajectory of the target terminal "Mobile-1". Among the two areas, the area which does not include the map's bottom-left (south-west) corner at which the wireless station "Mobile-2" is fixed is (1) the possible area of the target terminal "Mobile-1" when the target terminal "Mobile-1" is positioned above (north of) and right to (east of) the wireless station "Mobile-2".

The possible area calculation unit 117 fixes the wireless station "Mobile-2" at the bottom-right (south-east) corner, the upper-left (north-west) corner, and the upper-right (north-east) corner among the four corners of the map, and performs the same processing to respectively calculate (2) the possible area of the target terminal "Mobile-1" when the target terminal "Mobile-1" is positioned above (north of) and left to (east of) the wireless station "Mobile-2", (3) the possible area of the target terminal "Mobile-1" when the target terminal "Mobile-1" is positioned below (south of) and right to (east of) the wireless station "Mobile-2", and (4) the possible area of the target terminal "Mobile-1" when the target terminal "Mobile-1" is positioned below (south of) and left to (west of) the wireless station "Mobile-2".

The possible area calculation unit 117 obtains a union of the calculated four possible areas to calculate the possible area of the target terminal "Mobile-1" when an obstacle is present on the map indicated in the map information. (b) in FIG. 607 shows an example of the result of calculation of the possible area of the target terminal "Mobile-1".

When the transmission and reception control unit 116 obtains the position information on a wireless station among the pieces of information included in the wireless station information 600 an example of which is shown in FIG. 603, the possible area calculation unit 117 calculates the possible area using the position information on the wireless station.

FIG. 608 is a diagram for describing the method of calculating the possible area using the position information on a wireless station. When the position information on the wireless station "TV-1" is obtained, the target terminal "Mobile-1" is present on the circumference of a circle having the estimated distance information as the radius centering on the wireless station "TV-1". With an error in the distance estimation taken into account, a doughnut-shaped area having a width which is proportional to the distance accuracy information received from the distance estimation unit 112 is determined as the possible area of the target terminal.

Here, when the transmission and reception control unit 116 obtains the other wireless station information 700 an example of which is shown in FIG. 604, the possible area calculation unit 117 calculates the possible area using the other wireless station information 700. For example, suppose that the estimated distance information indicating the distance between the wireless stations "Mobile-2" and "Mobile-3" has been received from the distance estimation unit 112 and that the estimated distance information L7 indicating the distance between the wireless stations "Mobile-2" and "Mobile-3" has been received from the transmission and reception control unit 116. In this case, a triangle showing relative positions of the target terminal "Mobile-1", the wireless station "Mobile-2", and the wireless station "Mobile-3" can be calculated using three pieces of distance information. When this triangle moves on the map, one of the triangle vertices which indicates the target terminal "Mobile-1" draws a trajectory which shows the possible area of the target terminal "Mobile-1".

FIGS. 609 and 610 are diagrams for describing the method of calculating the possible area using the other wireless station information 700. The following first describes the case where the triangle vertices indicate, clockwise, the target terminal "Mobile-1", the wireless station "Mobile-2", and the wireless station "Mobile-3".

As shown in (a) in FIG. 609, the possible area calculation unit 117 fixes the wireless station "Mobile-2" at the bottom-left (south-west) corner among the four corners of the map, and measures the trajectory of the target terminal "Mobile-1" which is located apart by the distance indicated in the estimated distance information L2. Furthermore, the possible area calculation unit 117 fixes the wireless station "Mobile-3" at the bottom-left (south-west) corner among the four corners of the map, and measures the trajectory of the target terminal "Mobile-1".

Next, as shown in (b) in FIG. 609, the possible area calculation unit 117 measures the trajectory of the target terminal "Mobile-1" while moving the wireless stations "Mobile-2" and "Mobile-3" along the edges of the map from the state in which the wireless station "Mobile-2" is at the bottom-left (south-west) corner among the four corners of the map and the wireless station "Mobile-3" is at the left (west) edge of the map to the state in which the wireless station "Mobile-3" is at the bottom-left (south-west) corner among the four corners of the map and the wireless station "Mobile-2" is at the bottom (south) edge of the map.

The trajectory shown in (c) in FIG. 609 is obtained through this operation. Among the two areas partitioned into by this trajectory, the area which does not include the bottom-left (south-west) corner of the map is (1) the possible area of the target terminal "Mobile-1" when the target terminal "Mobile-1" is positioned above (north of) the wireless station "Mobile-2" and right to (east of) the wireless station "Mobile-3".

The possible area calculation unit 117 performs the same operation for the remaining four corners to calculate (2) the possible area of the target terminal "Mobile-1" when the target terminal "Mobile-1" is positioned right to (east of) the wireless station "Mobile-2" and below (south of) the wireless station "Mobile-3", (3) the possible area of the target terminal "Mobile-1" when the target terminal "Mobile-1" is positioned below (south of) the wireless station "Mobile-2" and left to (west of) the wireless station "Mobile-3", and (4) the possible area of the target terminal "Mobile-1" when the target terminal "Mobile-1" is positioned left to (west of) the wireless station "Mobile-2" and above (north of) the wireless station "Mobile-3".

The possible area calculation unit 117 obtains a union of the calculated four possible areas to calculate the possible area of the target terminal "Mobile-1" for the case where the other wireless station information is used. (a) in FIG. 610 shows an example of the result of calculation of the possible area of the target terminal "Mobile-1".

The possible area calculation unit 117 calculates the possible areas also for the case where the triangle vertices indicate, clockwise, the target terminal "Mobile-1", the wireless station "Mobile-3", and the wireless station "Mobile-2", and obtains a union of the calculated possible areas and the possible area shown in (a) in FIG. 610 to calculate the possible area shown in (b) in FIG. 610.

The possible area calculated in this manner is determined as the possible area of the target terminal "Mobile-1" for the case where the other wireless station information is used.

The possible area calculation unit 117 obtains a product set of the plural possible areas calculated based on the received estimated distance information, wireless station information, and other wireless station information, and outputs the product set to the correction unit 118.

Next, FIGS. 611 to 614 show an example of the calculation of the possible area in the map information and in the example of the placement of the wireless terminals shown in FIG. 602. FIG. 611 shows an example of the possible area calculated using the estimated distance information indicating the distance between the target terminal "Mobile-1" and the wireless station "Mobile-2". FIG. 612 shows an example of the possible area calculated using the estimated distance information indicating the distance between the target terminal "Mobile-1" and the wireless station "TV-1" and the wireless station information obtained from the wireless station "TV-1". FIG. 613 shows an example of the possible area calculated using the estimated distance information indicating the distance between the target terminal "Mobile-1" and the wireless station "AP-1" and the base station management information stored in the storage unit 119. The possible area calculation unit 117, for example, calculates these three possible areas and obtains a product set, and outputs the resulting possible area shown in FIG. 614 to the correction unit 118.

Referring back to FIG. 598, the following continues with the description of the configuration of the position estimation device 100. The correction unit 118 corrects the provisional position information received from the provisional position setting unit, based on the possible area received from the possible area calculation unit 117. More specifically, the correction unit 118 determines whether the coordinates indicated in the provisional position information are within or outside the possible area, and when the coordinates are outside the possible area, corrects the current position to a position, within the possible area, which is closest to the coordinates indicated in the provisional position information. In doing so, when there are plural positions within the possible area which are closest to the coordinates indicated in the provisional position information, the correction unit 118 corrects the current position indicated in the provisional position information to a position randomly selected from among the plural positions, for example. It is to be noted that when there are plural positions within the possible area which are closest to the coordinates indicated in the provisional position information, a position may be selected according to a predetermined rule (e.g., select the first position clockwise from the 12 o'clock direction, or select a position from among the plural positions which is close to the direction of the center of gravity) other than by random selection.

The storage unit 119 stores the base station information 200, the map information 500, and the table 900 of obstacles and correction scaling factors.

It is to be noted that the possible area calculated in the above description is on a flat plane; however, a three-dimensional possible area is also calculated using the same method. More specifically, the possible area is calculated by measuring the trajectories of the target terminal using eight vertices as the center.

<2. Operations>

Next, operations of the position estimation device 100 according to the present embodiment will be described.

FIG. 615 is a flowchart showing the entire operations of the position estimation device 100 according to the present embodiment. As shown in FIG. 615, the operations of the position estimation device 100 include the estimation of the autonomous navigation position information by autonomous navigation (Step S1801), the estimation of the RSSI position information using the receiving field strength (Step S1802), the setting of the provisional position information indicating a provisional position of the target terminal (Step S1803), the determination as to whether or not the provisional position information needs to be corrected (Step S1804), and the correction of the provisional position information using the possible area (Step S1805).

FIG. 616 is a flowchart showing the operation of estimating the autonomous navigation position information (Step S1801).

As shown in FIG. 616, first, the orientation change amount calculation unit 108 calculates an orientation change amount of the target terminal based on the angular velocity information received from the angular velocity sensor 103 (Step S1901), and the terminal movement amount calculation unit 109 calculates a movement amount of the target terminal based on the acceleration information received from the acceleration sensor 102 and the geomagnetism information received from the geomagnetic sensor 104 (Step S1902).

Next, the autonomous navigation position estimation unit 110 calculates the autonomous navigation position information based on the current position information at the previous position estimation stored in the storage unit 119 and an amount of movement of the target terminal (Step S1903), and calculates the autonomous navigation accuracy information based on the time period which has elapsed from the previous position estimation and the orientation change amount and the amount of movement of the target terminal from the previous position estimation (Step S1904).

With the operations shown in FIG. 616, the position estimation device 100 calculates the autonomous navigation position information and the autonomous navigation accuracy information.

FIG. 617 is a flowchart showing the operation of estimating the RSSI position information (Step S1802). As shown in FIG. 617, first, the wireless strength measurement unit 111 measures the receiving field strengths of signals transmitted by plural base stations (Step S2001).

Next, the distance estimation unit 112 selects the base stations measured by the wireless strength measurement unit 111, in descending order of the receiving field strength (Step S2002).

The distance estimation unit 112 determines whether or not the receiving field strength of the selected base station is greater than or equal to a predetermined threshold (Step S2003). When the receiving field strength is smaller than the threshold, the process proceeds to Step S2005.

When the receiving field strength of the selected base station is greater than or equal to the threshold, the distance estimation unit 112 estimates the distance between the selected base station and the target terminal and calculates the estimated distance information associated with the base station ID and the distance accuracy information indicating the accuracy of the estimated distance information, based on the receiving strength of the signal received from the selected base station (Step S2004).

It is to be noted that as shown in FIG. 600, the receiving field strength changes more significantly with decrease in the distance between the wireless station which has transmitted a signal and the wireless station which has received the signal. Thus, the lower the receiving field strength is, the less accurate the estimated distance information is. Therefore, performing the distance estimation only when the receiving strength is greater than or equal to a predetermined threshold ensures the minimal accuracy of the estimated distance information.

Referring back to FIG. 617, the distance estimation unit 112 determines whether or not the estimated distance information has been calculated for all the base stations measured by the wireless strength measurement unit 111 (Step S2005), and the process returns to Step S2002 when there is still a base station for which the estimated distance information has not been calculated yet.

When the estimated distance information is calculated for all the base stations measured by the wireless strength measurement unit 111, the RSSI position estimation unit 113 determines whether or not the distance estimation unit 112 has calculated the estimated distance information for three or more base stations (Step S2006). When the distance estimation unit 112 has calculated the estimated distance information for less than three base stations, the process proceeds to Step S1803.

When the distance estimation unit 112 has calculated the estimated distance information for three or more base stations, the RSSI position estimation unit 113 calculates the RSSI position information and the RSSI accuracy information using the position information on the base stations stored in the storage unit 119 and the estimated distance information (Step S2007).

Referring back to FIG. 615, the provisional position setting unit 114 calculates, as the provisional position information, a weighted average of the autonomous navigation position information and the RSSI position information using the autonomous navigation accuracy information and the RSSI accuracy information as weights, and calculates, as the provisional position accuracy information, an average value of the autonomous navigation accuracy information and the RSSI accuracy information (Step S1803).

It is to be noted that when the RSSI position estimation unit 113 cannot estimate the RSSI position information, the autonomous navigation position information and the autonomous navigation accuracy information are used as the provisional position information and the provisional position accuracy information.

The correction unit 118 determines whether or not the provisional position accuracy information is smaller than a predetermined threshold (Step S1804), and finishes the process when the provisional position accuracy information is greater than or equal to the threshold, determining the provisional position information as the final result of the position estimation.

When the provisional position accuracy information is smaller than the predetermined threshold, the position estimation device 100 corrects the provisional position information using the possible area (Step S1805).

FIG. 618 is a flowchart showing operations of correcting the provisional position information using the possible area.

First, the communication mode change instruction unit 115 instructs the wireless stations that belong to the same network to change the communication mode (Step S2101). The transmission and reception control unit 116 communicates with the wireless stations that belong to the same network and obtains the wireless station information and the other wireless station information (Step S2102).

Furthermore, the wireless strength measurement unit 111 measures the receiving field strengths of the signals transmitted by the wireless stations that belong to the same network (Step S2103).

Next, the distance estimation unit 112 selects the base stations measured by the wireless strength measurement unit 111, in descending order of the receiving field strength (Step S2104).

The distance estimation unit 112 determines whether or not the receiving field strength of the selected base station is greater than or equal to a predetermined threshold (Step S2105). When the receiving field strength is smaller than the threshold, the process proceeds to Step S2107.

When the receiving field strength of the selected base station is greater than or equal to the threshold, the distance estimation unit 112 estimates the distance between the selected base station and the target terminal and calculates the estimated distance information associated with the base station ID and the distance accuracy information indicating the accuracy of the estimated distance information, based on the receiving strength of the signal received from the selected base station (Step S2106).

The distance estimation unit 112 determines whether or not the estimated distance information has been calculated for all the base stations measured by the wireless strength measurement unit 111 (Step S2107), and the process returns to Step S2104 when there is still a base station for which the estimated distance information has not been calculated yet.

When the estimated distance information is calculated for all the wireless stations measured by the wireless strength measurement unit 111, the possible area calculation unit 117 calculates the possible area based on the estimated distance information, the wireless station information, the other wireless station information, and the map information (Step S2108).

When the possible area is calculated, the correction unit 118 corrects the provisional position information using the possible area (Step S2109) and finishes the process, determining the correction result as the final result of the position estimation.

<3. Conclusion>

The position estimation device 100 according to the present embodiment calculates the possible area for the provisional position information, using the map information indicating a spatial structure and information on the wireless stations which belong to the same network. The position estimation device 100 then corrects the provisional position information using the possible area.

This configuration enables accurate estimation of the position of the target terminal using the map information and the wireless station information on the wireless stations which belong to the same network, even when there are few base stations and/or when the wireless terminal is not equipped with a special positioning device.

(Supplementary Notes)

Although only an exemplary embodiment of the position estimation device according to an aspect of the present invention has been described above, the present invention is not limited to this embodiment. The exemplified position estimation device may be modified as below.

(1) In the above-described embodiment, the base station management information 200 shown in FIG. 599 is stored in the storage unit in advance; however, the present invention is not limited to this.

For example, the base station management information 200 may be stored in an externally-provided storage device, and the target terminal may obtain the base station management information through communication with the storage device as necessary.

(2) In the above-described embodiment, the movement amount of the target terminal is calculated by integrating the acceleration information twice; however, the method of calculating the movement amount of the target terminal is not limited to this. For example, the following is also possible: information on the length of stride or the like of a user of the target terminal is obtained in advance from the user, and the user's steps are detected using the acceleration information, to calculate the product of the length of stride and the steps as the movement amount of the target terminal.

(3) In the above-described embodiment, the possible area of the target terminal is calculated by measuring the trajectories of the target terminal using the wireless stations other than the target terminal as the center; however, the method of calculating the possible area is not limited to this. For example, presuming that the target terminal is present at particular coordinates on the map, the particular coordinates are determined as possible coordinates when a wireless station other than the target terminal is likely to be present on the map based on the estimated distance information, whereas the particular coordinates are determined as impossible coordinates when a wireless station other than the target terminal is not likely to be present on the map based on the estimated distance information. All the coordinates on the map are classified into the possible coordinates or the impossible coordinates, and the resulting set of the possible coordinates may be determined as the possible area.

(4) The above-described embodiment and modifications may be combined in part.

(5) It is also possible to record on recording media or distribute via various communication paths and so on a control program including program codes which are written in machine language or a high-level language to cause a processor of the position estimation device and various circuits connected to the processor to execute the distance estimation, correction, and other processes described in the above embodiment. Examples of the recording media include IC cards, hard disks, optical discs, flexible disks, ROMs, and flash memories. The distributed control program is provided for use by being stored in a memory and the like which can be read by the processor. As the processor executes the control program, each function described in the above embodiment is implemented. It is to be noted that rather than by directly executing the control program, the processor may execute the control program through compilation or by using an interpreter.

(6) Each functional structural element described in the above embodiment may be realized as a circuit which executes the function of the functional structural element or realized through execution of a program by one or more processors. Furthermore, the position estimation device according to an aspect of the present invention may be provided as a package of an integrated circuit such as IC and LSI. This package is incorporated into various devices for use, which allows the various devices to perform each function described in the embodiment.

It is to be noted that each functional block such as the distance estimation unit, each position estimation unit, the possible area calculation unit, and the correction unit is typically realized in the form of an LSI that is an integrated circuit. These LSIs may be manufactured as individual chips, or some or all of the LSIs may be integrated into one chip. Although the name used here is LSI, it is also called IC, system LSI, super LSI, or ultra LSI depending on the degree of integration. Furthermore, the means for circuit integration is not limited to the LSI, and a dedicated circuit and a general-purpose processor are also available. It is also acceptable to use: a field programmable gate array (FPGA) that is programmable after the LSI has been manufactured; and a reconfigurable processor in which connections and settings of circuit cells within the LSI are reconfigurable. Furthermore, if circuit integration technology that replaces LSI appears through progress in the semiconductor technology or other derivative technology, that circuit integration technology can be used for the integration of the functional blocks. Adaptation and so on of biotechnology is one such possibility.

(Supplementary Notes 2)

The following describes a structure of a position estimation device according to an aspect of the present invention and its variations and advantageous effects.

(a) A position estimation device according to an aspect of the present invention is a position estimation device that estimates a current position of a wireless terminal, the position estimation device including: a setting unit that sets provisional position information of the wireless terminal; a storage unit that stores map information indicating a spatial structure; an estimation unit that estimates distance information indicating a distance from each wireless station, using a receiving strength of a signal received from the wireless station; a calculation unit that calculates a possible area using the map information and the distance information; and a correction unit that corrects the provisional position information to within the possible area in the case where the provisional position information is outside the possible area.

With this configuration, using the map information and the distance information indicating the distances from the wireless stations increases the accuracy of the estimation of the position of the wireless terminal without requiring addition of a special positioning device even when there are few base stations whose positions are known in advance.

(b) In the position estimation device according to the above (a), the map information may indicate a structure of an obstacle which attenuates a wireless signal, wherein, in the case where the obstacle is present between two points indicated by the distance information in the map information, the calculation unit corrects the distance information according to the obstacle and calculates the possible area using the corrected distance information.

With this configuration, the distance information is corrected according to the obstacle that attenuates the wireless signal, and thus it is possible to increase the accuracy of the estimation of the position of the wireless terminal.

(c) The position estimation device according to the above (a) may further include an instruction unit that instructs wireless stations which belong to the same network to change a communication mode, wherein the estimation unit measures a receiving strength of a signal transmitted from the wireless station according to the instruction, and estimates the distance information using the measured receiving strength.

With this configuration, it is possible to estimate the distance information indicating the distances from the wireless stations present in the same network and to use the distance information for the position estimation.

(d) The position estimation device according to the above (c) may further include an obtainment unit that communicates with each wireless station and obtains wireless station information held in the wireless station, wherein the calculation unit calculates the possible area using the map information, the distance information, and the wireless station information.

(e) In the position estimation device according to the above (d), the obtainment unit may obtain position information of the wireless station held in the wireless station, as the wireless station information.

With this configuration, the possible area is calculated using the position information on the wireless station which belongs to the same network, and the position estimation is performed using the calculated possible area, and thus it is possible to increase the accuracy of the estimation of the position of the wireless terminal.

(f) In the position estimation device according to the above (d), the obtainment unit may obtain distance information between the wireless station and another wireless station held in the wireless station, as the wireless station information. With this configuration, it is possible to calculate a relative positional relationship between the wireless stations that belong to the same network using the distance information which is held by each wireless station and indicates the distance between the wireless station and another wireless station, and to calculate the possible area using the relative positional relationship between the wireless stations that belong to the same network. As a result, it is possible to increase the accuracy of the estimation of the position of the wireless terminal performed using the calculated possible area.

(g) In the position estimation device according to the above (d), the obtainment unit may obtain a transmitting strength of a signal transmitted from the wireless station, as the wireless station information, wherein the estimation unit estimates the distance information using the receiving strength and the transmitting strength.

With this configuration, it is possible to increase the accuracy of the estimation of the distance from the wireless station, and this leads to an increase in the accuracy of the estimation of the position of the wireless terminal.

[Embodiment G]

Embodiment G of the present invention describes a position estimation device and a position estimation method capable of estimating a position of the position estimation device with high accuracy without requiring installation of special equipment in a building.

The following describes Embodiment G of the present invention with reference to drawings.

Note that Embodiment G of the present invention described below shows one specific example of the present invention. The numerical values, shapes, structural elements, the arrangement and connection of the structural elements, etc., shown in the following embodiment are mere examples, and are therefore not intended to limit the present invention. The present invention is specified by the claims. Accordingly, among the structural elements in Embodiment G described below, structural elements not recited in any of the independent claims are described as not being necessarily required for achieving the object of the present invention but constituting more preferred embodiments.

[Embodiment G]

FIG. 619 is a functional block diagram of a position estimation device according to Embodiment G of the present invention.

A position estimation device 10 shown in FIG. 619 is fixed to, for example, a mobile terminal, and detects a position of the position estimation device 10 as a position of the mobile terminal.

The position estimation device 10 shown in FIG. 619 includes an acceleration sensor 101, an angular velocity sensor 102, a geomagnetic sensor 103, a movement state detection unit 104, a terminal posture detection unit 105, a position estimation unit 106, an information storage unit 107, a concentration pattern information storage unit 108, a pointing detection unit 109, a concentration calculation unit 110, a position correction unit 111, and a GUI display unit 112.

Since the position estimation device 10 is fixed to the mobile terminal, the states of the mobile terminal (terminal movement states) such as position, orientation, tilt, acceleration, acceleration direction, movement direction, movement distance, rotation direction, angular velocity, and the like are the same as the states of the position estimation device 10.

The acceleration sensor 101 detects a direction and a magnitude of a force such as gravity and inertial force acting on the acceleration sensor 101, in a local coordinate system (three-axis coordinate system of X, Y, and Z axes) fixed to the position estimation device 10. For example, in the case where the position estimation device 10 or the mobile terminal is shaped long in one direction, the longitudinal direction of the position estimation device 10 or the mobile terminal is the Z-axis direction, and the directions perpendicular to the Z axis and orthogonal to each other are the X-axis direction and the Y-axis direction.

The angular velocity sensor 102 detects a rotation direction and an angular velocity of the mobile terminal, at predetermined time intervals.

The geomagnetic sensor 103 detects a magnetic field strength in the local coordinate system, at predetermined time intervals. In detail, the geomagnetic sensor 103 detects a magnetic field strength in each of the X-axis direction, the Y-axis direction, and the Z-axis direction. A magnetic field (geomagnetism) in the position of the mobile terminal is expressed as one magnetic field vector, based on these magnetic field strengths of the three axes.

The movement state detection unit 104 corresponds to a movement state detection unit according to the present invention. The movement state detection unit 104 detects (calculates) a movement amount indicating a movement direction and a movement distance of the position estimation device 10 and a terminal movement state indicating a state in which the position estimation device 10 is moving, based on a posture (posture information) detected by the terminal posture detection unit 105 and the detection result of the acceleration sensor 101.

In detail, the movement state detection unit 104 calculates (detects), at predetermined time intervals, a movement direction, a movement velocity, and a movement distance of the mobile terminal in a global coordinate system fixed to the earth or a home coordinate system fixed to the inside of the home, based on the posture (posture information) calculated by the posture detection unit 105 and the acceleration information outputted from the acceleration sensor 101. A parameter indicating the movement direction and the movement distance is referred to as the movement amount.

In other words, the movement state detection unit 104 analyzes the output (acceleration information) of the acceleration sensor 101, and determines whether or not the position estimation device 10 is in a movement (moving) state. Thus, the movement state detection unit 104 calculates (detects) whether or not the position estimation device 10 is in the terminal movement state. The movement state detection unit 104 also calculates (detects) the movement direction of the position estimation device 10, from the direction information by the geomagnetic sensor 103 or the like and the output (acceleration information) of the acceleration sensor 101 accumulated immediately before.

In this embodiment, for example, in the case where the position estimation device 10 is in the movement state, the movement state detection unit 104 calculates a movement amount from when there is concentration of a position pointed by a pointing direction immediately before to when a pointing target is found, i.e. a movement amount between two points in time. The pointing target mentioned here is, for example, a TV, an air conditioner, or the like in the home.

The posture detection unit 105 corresponds to a posture detection unit according to the present invention. The posture detection unit 105 detects (calculates) the posture of the position estimation device 10, based on at least the detection results of the acceleration sensor 101 and the geomagnetic sensor 103. The posture includes a tilt of the mobile terminal with respect to a horizontal plane and an orientation of the mobile terminal on the horizontal plane. In this embodiment, the posture detection unit 105 detects the posture of the position estimation device 10, based on the amount of change of the orientation of the position estimation device 10 detected by the angular velocity sensor 102 and the detection results of the acceleration sensor 101 and the geomagnetic sensor 103.

That is, the posture detection unit 105 calculates (detects), at predetermined time intervals, the posture of the mobile terminal with respect to the earth, based on the detection results of the acceleration sensor 101, the angular velocity sensor 102, and the geomagnetic sensor 103. In more detail, the terminal posture detection unit 105 obtains the value (acceleration information) of the acceleration sensor 101, and obtains a gravity direction. The terminal posture detection unit 105 calculates (detects) the posture (posture information) of the position estimation device 10 with respect to the horizontal plane (xy plane), from the obtained gravity direction. The terminal posture detection unit 105 also obtains a change from a previous posture detected by the angular velocity sensor 102 or the value of the geomagnetic sensor 103, and calculates (detects) the posture (orientation) of the position estimation device 10 on the horizontal plane.

The position estimation unit 106 corresponds to a position estimation unit according to the present invention. The position estimation unit 106 estimates current position coordinates representing a current position of the position estimation device 10. The position estimation unit 106 also estimates the current position, from the terminal movement state and information of the current position (current position coordinates) at the time of previous estimation. In detail, the position estimation unit 106 estimates the coordinates away from the previously estimated coordinates by the movement amount detected by the movement state detection unit 104, as the current position coordinates. In more detail, the position estimation unit 106 calculates (estimates) the current position coordinates of the position estimation device 10 as the current position, based on the immediately previously calculated coordinates and the movement amount calculated by the movement state detection unit 104. The estimated current position coordinates are used as the immediately previously calculated coordinates when calculating the next current position coordinates. The immediately previously calculated coordinates are hereafter also referred to as immediately previous current position coordinates. For example, the position estimation unit 106 estimates the current position coordinates (X, Y, Z), based on the movement amount from the immediately previous current position coordinates (X0, Y0, Z0) at the previous estimation.

The position estimation unit 106 may further calculate estimated position accuracy which is the accuracy of the current position coordinates, based on at least one of: a movement distance of the position estimation device 10 from coordinates of a reference point passed by the position estimation device 10 immediately before; complexity of movement of the position estimation device 10; and a time period of movement of the position estimation device 10. In this case, the position estimation unit 106 stores the estimated current position coordinates and the calculated estimated position accuracy in the information storage unit 107 in association with each other.

The pointing detection unit 109 includes a pointing direction detection unit 1091 and a pointing target detection unit 1092.

The pointing direction detection unit 1091 corresponds to a pointing direction detection unit according to the present invention. The pointing direction detection unit 1091 detects a pointing direction which is a direction pointed by the user using the position estimation device 10.

The pointing target detection unit 1092 corresponds to a target detection unit according to the present invention. The pointing target detection unit 1092 detects a pointing target which is a target pointed by the user, based on the pointing direction detected by the pointing direction detection unit 1091. In detail, the pointing target detection unit 1092 searches for (detects) a pointing target on an extended line in the pointing direction which is the upward (Z-axis) direction of the position estimation device 10. The pointing target mentioned here is, for example, a TV, an air conditioner, or the like in the home, as mentioned above. The pointing target is stored together with its coordinates in the information storage unit 107 beforehand, as a pointing target candidate.

The information storage unit 107 corresponds to an information storage unit according to the present invention. The information storage unit 107 stores the current position coordinates estimated by the position estimation unit 106 and the estimated position accuracy calculated by the position estimation unit 106 in association with each other.

The information storage unit 107 also stores each candidate target which is a pointing target candidate, together with its coordinates. The information storage unit 107 may also store target position accuracy which is the accuracy of the coordinates of the candidate target and calculated according to a method of registering the candidate target, together with the candidate target and its coordinates.

The concentration calculation unit 110 corresponds to a concentration calculation unit according to the present invention. The concentration calculation unit 110 specifies an area in which the pointing target is not present and in which the position pointed by the pointing direction detected by the pointing direction detection unit 1091 is concentrated (concentrated area of the position), within a predetermined time period immediately before the pointing target is detected by the pointing target detection unit 1092. The concentrated area is a specific area that does not include the pointing target and includes the position pointed by the user in the pointing direction with at least a predetermined distribution of concentration. The concentration calculation unit 110 then calculates a concentration direction which is a direction to the specified concentrated area. The predetermined time period is, for example, 3 seconds.

In other words, the concentration calculation unit 110 specifies the concentrated area of the pointing direction within the predetermined time period such as 3 seconds before the time (current time) at which the pointing target is detected by the pointing target detection unit 1092.

Here, the concentration calculation unit 110 specifies one of a plurality of search areas of a fixed size partitioned for concentrated area search, as the concentrated area.

Note that the concentration calculation unit 110 may adjust the size of the search area according to the position accuracy such as the estimated position accuracy or the target position accuracy. For example, the concentration calculation unit 110 increases the size of the search area in the case where the position accuracy is low.

In detail, the concentration calculation unit 110 may change the size of the search area, according to the current position coordinates and the estimated position accuracy associated with the current position coordinates in the information storage unit 107. For example, in the case where the estimated position accuracy associated with the current position coordinates is equal to or less than a threshold, the concentration calculation unit 110 increases the size of the search area. In other words, in the case where the estimated position accuracy stored in the information storage unit 107 is equal to or less than the threshold, the concentration calculation unit 110 increases the size of the search area.

Moreover, the concentration calculation unit 110 may change the size of the search area, according to the pointing target detected by the pointing target detection unit 1092 and the target position accuracy of the candidate target corresponding to the pointing target stored in the information storage unit 107. For example, in the case where the target position accuracy stored in the information storage unit 107 is equal to or less than a threshold, the concentration calculation unit 110 increases the size of the search area.

The concentration pattern storage unit 108 stores information for specifying the concentrated area (area having concentration) calculated by the concentration calculation unit 110. For example, the concentration pattern storage unit 108 stores a concentration pattern for specifying the area pointed by the user with at least the predetermined distribution of concentration. The concentration pattern storage unit 108 may store the area specified by the concentration calculation unit 110 and the concentration direction corresponding to the area.

The position correction unit 111 corresponds to a position correction unit according to the present invention. The position correction unit 111 corrects the current position coordinates estimated by the position estimation unit 106, using the concentration direction calculated by the concentration calculation unit 110.

Here, the position correction unit 111 calculates a possible area using the concentration direction with respect to the position of the detected pointing target. The possible area is an area including coordinates at which the position estimation device 10 is likely to be actually present when the user points to the pointing target using the position estimation device 10. The position correction unit 111 then determines, in the calculated possible area, coordinates at which the position estimation device 100 is actually present when the user points to the pointing target using the position estimation device 10 and to which the correct position coordinates are to be corrected. The position correction unit 111 corrects the current position coordinates to the determined coordinates.

In more detail, through the use of the direction (concentration direction) from the current position of the position estimation device 10 at the time of concentration to the calculated concentrated area, the position correction unit 111 calculates, as the possible area, an area of a predetermined width on a straight line that is in an opposite direction to the concentration direction and extends from a current position of a provisional pointing target on an assumption that the provisional pointing target is placed in a logical space. That is, the position correction unit 111 defines the area (possible area) in which the information (current position coordinates) of the current position of the mobile terminal is likely to be present, with respect to the position (coordinates (X2, Y2, Z2)) of the pointing target. The position correction unit 111 then corrects the current position coordinates (current position) to the coordinates in the calculated possible area that are closest to the current position coordinates. Though the position correction unit 111 corrects the current position coordinates (current position) to the coordinates in the calculated possible area that are closest to the current position coordinates, this is not a limit for the present invention. The position correction unit 111 may correct the current position coordinates to the center of the calculated possible area.

Note that the position correction unit 111 may adjust the width (size) of the possible area according to the position accuracy such as the estimated position accuracy or the target position accuracy.

In detail, the position correction unit 111 may change the width (size) of the possible area, according to the current position coordinates and the estimated position accuracy associated with the current position coordinates in the information storage unit 107. For example, in the case where the estimated position accuracy associated with the current position coordinates is equal to or less than a threshold, the position correction unit 111 decreases the width (size) of the possible area. In other words, in the case where the estimated position accuracy stored in the information storage unit 107 is equal to or less than the threshold, the position correction unit 111 decreases the width (size) of the possible area.

Thus, in the case where the estimated position accuracy is low, the position correction unit 111 decreases the width (size) of the possible area so that the position is corrected to a greater extent.

Moreover, the position correction unit 111 may change the width (size) of the possible area, according to the pointing target detected by the pointing target detection unit 1092 and the target position accuracy of the candidate target corresponding to the pointing target stored in the information storage unit 107. For example, in the case where the target position accuracy stored in the information storage unit 107 is equal to or less than a threshold, the position correction unit 111 increases the width (size) of the possible area.

Thus, the position correction unit 111 increases the width (size) of the possible area in the case where the target position accuracy is low. That is, in the case where the target position accuracy is low, the position estimation device 10 increases the width (size) of the possible area so that the position is corrected to a lesser extent.

Though the above describes the case where the position estimation device 10 is not in the movement state, the present invention is not limited to this. Since the mobile terminal including the position estimation device 10 can be carried by the user, the user may point to the pointing target while moving. In such a case, the position correction unit 111 may be configured as follows.

In the case where the terminal movement state is detected and also the pointing target is detected by the pointing target detection unit 1092, the position correction unit 111 corrects the current position coordinates by taking into consideration the movement amount of the position estimation device 10. In detail, the position correction unit 111 corrects the current position coordinates to coordinates that are away from the coordinates corrected using the calculated concentration direction by the movement amount of the position estimation device 10 during a time period, in the predetermined time period, from when the concentrated area of the pointing direction is specified by the concentration calculation unit 110 to when the pointing target is detected by the pointing target detection unit 1092.

The GUI display unit 112 corresponds to a display unit according to the present invention. The GUI display unit 112 displays control information relating to the pointing target, in the case where the pointing target is detected by the pointing target detection unit 1092. For example, the control information relating to the pointing target is a GUI (Graphical User Interface) screen such as a control remote control screen, and user interface information (UI information).

The position estimation device 10 has the structure described above.

With this structure, the position of the position estimation device 10 can be estimated with high accuracy, without requiring installation of special equipment such as a dedicated antenna of indoor GPS or the like in the building.

Note that the position estimation device 10 does not necessarily need to include the information storage unit 107. Necessary information may be obtained from a cloud or the like on a network accessible by the mobile terminal including the position estimation device 10.

The following describes characteristic operations of the position estimation device 10 according to Embodiment G. In detail, an example where the position estimation device 10 determines that the estimated current position information (current position coordinates) has an error and corrects the current position information (current position coordinates) is described below.

Consider the following situation. The user points, using the position estimation device 10, to a pointing target which the user is actually seeing, but the pointing target is not detected at once. The user then randomly shakes the top end of the position estimation device 10, as a result of which the pointing target is detected. In the following description, the term "mobile terminal" actually held by the user is used based on an assumption that the position estimation device 10 is included in the mobile terminal.

FIGS. 620A and 620B are diagrams showing a difference between positional relationships recognized by the user and the mobile terminal for the pointing target. FIG. 620A shows the positional relationship recognized by the user, while FIG. 620B shows the positional relationship recognized by the mobile terminal.

In FIG. 620A, first the user points the mobile terminal to a pointing target D1 (coordinates (X2, Y2, Z2)) which the user is actually seeing, in the upward direction (as shown by T1) in the drawing. If the current position information (current position coordinates) of the mobile terminal held by the user is accurate, the pointing target D1 is detected at once and control information associated with the pointing target D1 is displayed. If the current position information (current position coordinates) of the mobile terminal has deviation (error), on the other hand, the mobile terminal is unable to detect the pointing target D1. FIG. 620A shows the case where the current position information of the mobile terminal has deviation. That is, even when the user points the mobile terminal to the pointing target D1 (like the mobile terminal T1), the mobile terminal cannot detect the pointing target D1 because of an error in the current position information of the mobile terminal.

Next, the user points the mobile terminal to near the pointing target D1 pointed once. In detail, the user changes the pointing direction by randomly shaking the top of the mobile terminal or the like so that the mobile terminal can detect the pointing target.

As a result, the mobile terminal detects the pointing target D1 when pointed to a position D2 (coordinates (X3, Y3, Z3)) where the pointing target is actually not present, as shown by T2 in the drawing. This can be explained as follows, from the viewpoint of the mobile terminal shown in FIG. 620B. Not the coordinates (X1, Y1, Z1) where the user is actually present but the coordinates (X4, Y4, Z4) are estimated as the current position information (current position coordinates) of the mobile terminal. Accordingly, when the user points the mobile terminal as shown by T2 in the drawing, the mobile terminal detects the pointing target D1 on an extended line in the pointing direction.

That is, despite the coordinates (X1, Y1, Z1) being the actual position of the user, the coordinates (X4, Y4, Z4) are estimated as the current position information (current position coordinates) by the mobile terminal. For this reason, the pointing target D1 cannot be detected even when the user points the mobile terminal to the actually seen pointing target D1 (coordinates (X2, Y2, Z2)).

The following describes a method whereby the mobile terminal including the position estimation device 10 according to the present invention determines whether or not the estimated current position information (current position coordinates) has an error, in the situation shown in FIGS. 620A and 620B.

FIG. 621 is a diagram for describing an example of the method whereby the mobile terminal determines whether or not the estimated current position information (current position coordinates) has an error. The coordinates based on the current position information (current position coordinates) estimated by the mobile terminal are shown in FIG. 621.

As shown in FIG. 621, upon detecting the pointing target D1 when the mobile terminal is pointed as shown by T2 in the drawing, the mobile terminal calculates whether or not there is a concentrated area of the position pointed by the user in the pointing direction immediately before the pointing target D1 is detected. The concentrated area is an area pointed by the user and having predetermined concentration of the position pointed by the user. Note that the concentrated area is an area in a direction in which the user is actually seeing the entity.

Once determining that there is the concentrated area, the mobile terminal can determine that the current position information (current position coordinates) of the mobile terminal has deviation. This is because, in the case where the current position information (current position coordinates) estimated by the mobile terminal as the coordinates (X4, Y4, Z4) deviates from the actual position, there is a high likelihood that the user points to the area different from the position of the pointing target D1 immediately before.

The following describes a method whereby, in the case of determining that the estimated current position information (current position coordinates) has an error, the mobile terminal corrects the current position information (current position coordinates), with reference to drawings.

FIG. 622 is a diagram for describing an example of the method whereby, in the case of determining that the estimated current position information has an error, the mobile terminal corrects the current position information. The coordinates based on the current position information (current position coordinates) estimated by the mobile terminal are shown in FIG. 622, too.

First, the mobile terminal assumes that the position (coordinates (X5, Y5, Z5)) of the pointing target pointed by the user immediately before is the position (coordinates (X2, Y2, Z2)) of the pointing target. The mobile terminal defines an area (possible area) in which the current position information (current position coordinates) of the mobile terminal is likely to be present, based on the position (coordinates (X2, Y2, Z2)) of the pointing target. In detail, the mobile terminal translates the direction (direction information) from the estimated current position information (current position coordinates (X4, Y4, Z4)) to the position (coordinates (X5, Y5, Z5)) of the pointing target pointed by the user immediately before, so as to cross the pointing target D1. The mobile terminal then calculates an area of a predetermined width centering on a straight line that extends from the position of the pointing target D1 in a direction opposite to the above-mentioned direction, as the possible area.

The mobile terminal then corrects the current position coordinates (current position) to the coordinates in the calculated possible area that are closest to the current position coordinates. Thus, the mobile terminal can correct the error of the estimated current position coordinates through the user's operation, with it being possible to improve the accuracy of the estimated current position coordinates. Though the mobile terminal corrects the current position coordinates (current position) to the coordinates in the calculated possible area that are closest to the current position coordinates, this is not a limit for the present invention. The mobile terminal may correct the current position coordinates to the center of the calculated possible area, as mentioned above.

The following describes a method whereby the mobile terminal calculates whether or not there is a concentrated area of the pointing direction pointed by the user immediately before the pointing target D1 is detected, with reference to FIG. 623.

FIG. 623 is a diagram for describing an example of the method whereby the mobile terminal determines whether or not there is a concentrated area of the pointing direction.

The determination of whether or not the pointing direction is concentrated in a specific area depends on the distance between the mobile terminal and a plane including the area.

In this embodiment, as shown in (a) in FIG. 623 as an example, a logical plane (measurement plane) is set at a predetermined distance such as 5 m from the mobile terminal, centering on the pointing direction of the mobile terminal. The mobile terminal divides the measurement plane into blocks of a predetermined size, as shown in (b) in FIG. 623. For example, the measurement plane may be divided into blocks of 50 cm square.

Through the use of the measurement plane, the mobile terminal determines whether or not there is a concentrated area among areas pointed within a predetermined time period such as 3 seconds, as mentioned above. For example, in the case of determining the concentrated area using the measurement plane, the mobile terminal measures the coordinates intersecting with the pointing direction on a 3×3 block basis (search area basis), and calculates the evidence (presence) of the coordinates intersecting with the pointing direction. The mobile terminal can then determine a block (search area) in which the evidence (presence) of the coordinates intersecting with the pointing direction is equal to or more than a threshold (e.g. 5 times) with respect to an average and also the evidence (presence) is largest in number, as the concentrated area.

In the case where the evidence (presence) of the coordinates intersecting with the pointing direction is less than the threshold (e.g. 5 times) with respect to the average, the mobile terminal determines that there is no concentrated area.

The mobile terminal may adjust the size of the search area according to the position accuracy such as the estimated position accuracy or the target position accuracy. For example, the mobile terminal may increase the size of the search area from 3×3 blocks to 5×5 blocks, in the case where the position accuracy is low.

In this way, the position estimation device 10 determines that the estimated current position information (current position coordinates) has an error, and corrects the current position information (current position coordinates).

Though the above describes the case where the position estimation device 10 is not in the movement state, the present invention is not limited to this. Since the mobile terminal including the position estimation device 10 can be carried by the user, the user may point to the pointing target while moving. The following describes an example of a method of determining that the estimated current position information (current position coordinates) has an error and correcting the current position information (current position coordinates) in the case where the position estimation device 10 is in the movement state.

The situation considered here is the same as that in FIGS. 620A and 620B, but differs in that the mobile terminal moves from when the user points, using the position estimation device 10, the pointing target which the user is actually seeing to when the pointing target is detected in the case where the user randomly shakes the top end of the position estimation device 10 from side to side.

FIGS. 624A and 624B are diagrams showing a difference between positional relationships recognized by the user and the mobile terminal for the pointing target, in the above situation. FIG. 624A shows the positional relationship recognized by the user, while FIG. 624B shows the positional relationship recognized by the mobile terminal.

In FIG. 624A, first the user points the mobile terminal to the pointing target D1 (coordinates (X2, Y2, Z2)) which the user is actually seeing, in the upward direction (as shown by T3) in the drawing. FIG. 624A shows the case where the current position information of the mobile terminal has deviation, as in FIG. 620A. That is, even when the user points the mobile terminal to the pointing target D1 (like the mobile terminal T1), the mobile terminal cannot detect the pointing target D1 because of an error in the current position information of the mobile terminal.

Next, the user points the mobile terminal to near the pointing target D1 pointed once. In detail, the user changes the pointing direction by randomly shaking the top of the mobile terminal or the like so that the mobile terminal can detect the pointing target. During this time, for example, the user (mobile terminal) is moving.

The mobile terminal detects the pointing target D1 when pointed to the position D2 (coordinates (X3, Y3, Z3)) where the pointing target is actually not present, as shown by T4 in the drawing. This can be explained as follows, from the viewpoint of the mobile terminal shown in FIG. 624B. Not the coordinates (X1, Y1, Z1) where the user is actually present after the movement but the coordinates (X4, Y4, Z4) are estimated as the current position information (current position coordinates) of the mobile terminal. Accordingly, when the user points the mobile terminal as shown by T4 in FIG. 624A or 624B, the mobile terminal detects the pointing target D1 on an extended line in the pointing direction.

That is, despite the coordinates (X1, Y1, Z1) being the actual position of the user when the pointing target is detected by the mobile terminal, the coordinates (X4, Y4, Z4) are estimated as the current position information (current position coordinates) by the mobile terminal when the pointing target is detected by the mobile terminal, as shown by T4 in the drawing. For this reason, the pointing target D1 cannot be detected even when the user points the mobile terminal to the actually seen pointing target D1 (coordinates (X2, Y2, Z2)). In other words, the user points the mobile terminal as shown by T3 in FIG. 624B and, after the certain movement, points the mobile terminal as shown by T4' in FIG. 624B. Here, the mobile terminal detects the pointing target, at the coordinates (X4, Y4, Z4) which are the estimated current position information (current position coordinates).

The following describes a method whereby, in the case of determining that the estimated current position information (current position coordinates) has an error, the mobile terminal corrects the current position information (current position coordinates), with reference to drawings. Since the method whereby the mobile terminal determines whether or not the estimated current position information (current position coordinates) has an error is the same as in FIG. 621, its description is omitted.

FIGS. 625, 626A, and 626B are diagrams for describing an example of the method whereby, in the case of determining that the estimated current position information has an error, the mobile terminal corrects the current position information. The coordinates based on the current position information (current position coordinates) estimated by the mobile terminal are shown in FIGS. 625, 626A, and 626B.

As shown in FIG. 625, first the mobile terminal defines the possible area based on the time of concentration, in the same way as in FIG. 622. After this, the movement state detection unit 104 calculates the movement amount of the mobile terminal from when there is concentration of the pointing direction immediately before to when the pointing target is detected. The position estimation unit 106 moves the possible area by the movement amount of the mobile terminal calculated by the movement state detection unit 104.

The mobile terminal then corrects the current position coordinates (current position) to the position in the calculated possible area that is closest to the current position coordinates (current position). Thus, the mobile terminal can correct the error of the estimated current position coordinates through the user's operation even when moving, with it being possible to improve the accuracy of the estimated current position coordinates.

In this way, the position correction can be carried out without installation of special equipment in the building.

This is described below, with reference to FIGS. 626A and 626B. FIG. 626A is the same as FIG. 624A, but differs in that D2 in FIG. 624A is replaced with the recognition by the mobile terminal. That is, in FIG. 626A, D2 in FIG. 624A is shown as a concentrated area D3 (coordinates (X5, Y5, Z5)) pointed by the user immediately before the pointing target is detected. In addition, the current position information (current position coordinates) at the time when the mobile terminal detects the pointing target is shown as the coordinates (X4, Y4, Z4).

As shown in FIG. 626B, first the mobile terminal assumes that the position (coordinates (X5, Y5, Z5)) of the concentrated area D3 pointed by the user immediately before the pointing target is detected is the position (coordinates (X5, Y5, Z5)) of the pointing target. Here, the mobile terminal moves from when the concentrated area D3 is pointed to when the pointing target is actually detected. Accordingly, while taking into consideration the movement amount of the mobile terminal, the mobile terminal defines the area (possible area) in which the current position information (current position coordinates) of the mobile terminal is likely to be present, based on the position (coordinates (X2, Y2, Z2)) of the pointing target.

In detail, the mobile terminal first specifies a position of a provisional pointing target D1', by adding the movement amount to the pointing target D1 (coordinates (X2, Y2, Z2)). The mobile terminal then translates the direction (direction information) from the current position information (current position coordinates (X5, Y5, Z5)) to the concentrated area D3 pointed by the user immediately before the pointing target is detected, so as to cross the provisional pointing target D1'. The mobile terminal calculates an area of a predetermined width centering on a straight line that extends from the position of the provisional pointing target D1' in a direction opposite to the above-mentioned direction, as the possible area.

The mobile terminal then corrects the current position coordinates (current position) to the coordinates in the calculated possible area that are closest to the current position coordinates.

Thus, the mobile terminal can correct the error of the estimated current position coordinates through the user's operation, with it being possible to improve the accuracy of the estimated current position coordinates.

Though the mobile terminal corrects the current position coordinates (current position) to the coordinates in the calculated possible area that are closest to the current position coordinates, this is not a limit for the present invention. The mobile terminal may correct the current position coordinates to the center of the calculated possible area, as mentioned above.

The following describes process flow of the mobile terminal, with reference to drawings.

FIGS. 627 to 632 are flowcharts for describing process flow of the mobile terminal.

The process shown in FIG. 627 is described first. FIG. 627 shows process flow up to when the mobile terminal estimates the current position information (current position coordinates).

In FIG. 627, first the movement state detection unit 104 analyzes the output (acceleration information) of the acceleration sensor 101, and determines whether or not the mobile terminal is in the movement state (Step S101).

In the case where the movement state detection unit 104 determines that the mobile terminal is not in the movement state (terminal movement state) (Step S102: No), the mobile terminal proceeds to F01 in FIG. 628.

In the case where the movement state detection unit 104 determines that the mobile terminal is in the movement state (terminal movement state) (Step S102: Yes), the posture detection unit 105 obtains the value of the acceleration sensor 101, and obtains the gravity direction (Step S103).

Next, the posture detection unit 105 calculates the posture (posture information) of the mobile terminal with respect to the horizontal plane, from the obtained gravity direction (Step S104).

Next, the posture detection unit 105 obtains the change from the previous posture detected by the angular velocity sensor 102 or the value of the geomagnetic sensor 103, and calculates the orientation of the mobile terminal on the horizontal plane (Step S105).

Next, the movement state detection unit 104 calculates the movement direction of the mobile terminal obtained from the direction information by the geomagnetic sensor 103 or the like and the output of the acceleration sensor 101 accumulated immediately before (Step S106).

The position estimation unit 106 then estimates the current position information (coordinates (X, Y, Z)), using the movement amount from the previously estimated current position information (e.g. the previously estimated current position coordinates (X0, Y0, Z0)) (Step S107).

The mobile terminal then proceeds to F02 in FIG. 630.

The process shown in FIG. 628 is described next. FIG. 628 shows process flow in which the mobile terminal detects a pointing target.

In FIG. 628, first the pointing detection unit 109 searches for (detects) a pointing target such as a TV on an extended line in the pointing direction of the mobile terminal (Step S108). In detail, in the case where the movement state detection unit 104 determines that the mobile terminal is not in the movement state in Step S102 in FIG. 627 (Step S102: No), the pointing direction detection unit 1091 detects the pointing direction which is the direction pointed by the user using the mobile terminal. Following this, the pointing target detection unit 1092 searches for (detects) a pointing target on the extended line in the pointing direction of the mobile terminal.

In the case where the pointing target detection unit 1092 does not detect the pointing target (Step S109: Yes), the mobile terminal proceeds to F05 in FIG. 631.

In the case where the pointing target detection unit 1092 detects the pointing target (Step S109: Yes), the GUI display unit 112 displays control information, e.g. a GUI such as a remote control screen, associated with the pointing target (Step S110).

The GUI display unit 112 then determines whether or not the user is using the control information (Step S111). In the case where the GUI display unit 112 determines that the user is not using the control information (GUI) (Step S111: No), the mobile terminal proceeds to F05 in FIG. 631.

In the case where the GUI display unit 112 determines that the user is using the control information (GUI) (Step S111: Yes), the mobile terminal proceeds to F03 in FIG. 629.

The process shown in FIG. 629 is described next. FIG. 629 shows process flow up to when the mobile terminal corrects (modifies) the estimated current position information (current position coordinates) using a concentrated area.

In FIG. 629, first the concentration calculation unit 110 determines whether or not there is a concentrated area (Step S112). In detail, in the case where the GUI display unit 112 determines that the user is using the control information (GUI) in Step S111 (Step S111: Yes), the concentration calculation unit 110 determines whether or not an area in which the pointing target is not present and in which the position pointed by the pointing direction detected by the pointing direction detection unit 1091 is concentrated can be specified within a predetermined time period immediately before the pointing target is detected by the pointing target detection unit 1092.

Here, the concentration calculation unit 110 may determine whether or not there is a concentrated area, without being triggered by the determination by the GUI display unit 112 as to whether or not the user is using the control information (GUI).

In the case where the concentration calculation unit 110 does not find the concentrated area in Step S112 (Step S112: No), the mobile terminal proceeds to F06 in FIG. 632.

In the case where the concentration calculation unit 110 finds the concentrated area in Step S112 (Step S112: Yes), the pointing target detection unit 1092 determines whether or not a candidate target different from the pointing target desired by the user is present in the concentrated area (Step S113).

In the case where the pointing target detection unit 1092 detects a candidate target different from the pointing target desired by the user in the concentrated area in Step S113 (Step S113: Yes), the mobile terminal proceeds to F06 in FIG. 632.

In the case where the pointing target detection unit 1092 detects no candidate target different from the pointing target desired by the user in the concentrated area in Step S113 (Step S113: No), the mobile terminal proceeds to Step S114. The movement state detection unit 104 assumes that the entity of the pointing target is present in the concentrated area, and obtains the direction information at the time when the mobile terminal points to the concentrated area (Step S114).

The direction information is, for example, the direction of the coordinates of D3 with respect to the coordinates of the mobile terminal in FIG. 621.

Next, regarding the direction indicated by the obtained direction information from the current position of the mobile terminal, the position correction unit 111 calculates an area of a predetermined with on a straight line that is in a direction opposite to the above-mentioned direction and extends from the position of the pointing target in the case where the pointing target is placed in a logical space, as a possible area (Step S115).

The mobile terminal then proceeds to F06 in FIG. 632.

The process shown in FIG. 630 is described next. FIG. 630 shows process flow in which the mobile terminal detects the pointing target.

In FIG. 630, first the pointing direction detection unit 1091 searches for (detects) a pointing target such as a TV on an extended line in the pointing direction of the mobile terminal (Step S116).

Following this, the pointing target detection unit 1092 determines whether or not the pointing target is found (Step S117).

In the case where the pointing target detection unit 1092 determines that the pointing target is not found (Step S117: No), the mobile terminal proceeds to F05 in FIG. 631.

In the case where the pointing target detection unit 1092 determines that the pointing target is found (Step S117: Yes), the GUI display unit 112 displays control information associated with the pointing target (Step S118). The control information mentioned here is a GUI such as a remote control screen, as an example.

The GUI display unit 112 then determines whether or not the user is using the GUI (Step S119).

In the case where the GUI display unit 112 determines that the user is not using the GUI (Step S119: No), the mobile terminal proceeds to F05 in FIG. 631.

In the case where the GUI display unit 112 determines that the user is using the GUI (Step S119: Yes), the concentration calculation unit 110 determines whether or not there is a concentrated area of the pointing direction within a predetermined time period (3 seconds) before the current time (Step S120).

That is, the concentration calculation unit 110 determines whether or not an area (concentrated area) in which the pointing target is not present and in which the position pointed by the pointing direction detected by the pointing direction detection unit 1091 is concentrated can be specified within the predetermined time period immediately before the pointing target is detected by the pointing target detection unit 1092.

The mobile terminal then proceeds to F04 in FIG. 631.

The process shown in FIG. 631 is described next. FIG. 631 shows process flow in which the mobile terminal detects the pointing target while the mobile terminal is in the movement state (the mobile terminal is moving).

In FIG. 631, first the concentration calculation unit 110 determines whether or not there is a concentrated area (Step S121). In detail, in the case where the GUI display unit 112 determines that the user is using the control information (GUI) (Step S119: Yes), the concentration calculation unit 110 determines whether or not an area in which the pointing target is not present and in which the position pointed by the pointing direction detected by the pointing direction detection unit 1091 is concentrated can be specified within a predetermined time period immediately before the pointing target is detected by the pointing target detection unit 1092, in Step S121.

Here, the concentration calculation unit 110 may determine whether or not there is a concentrated area, without being triggered by the determination by the GUI display unit 112 as to whether or not the user is using the control information (GUI).

In the case where the concentration calculation unit 110 does not find the concentrated area in Step S121 (Step S121: No), the mobile terminal proceeds to F07 in FIG. 632.

In the case where the concentration calculation unit 110 finds the concentrated area in Step S121 (Step S121: Yes), the pointing target detection unit 1092 determines whether or not a candidate target different from the pointing target desired by the user is present in the concentrated area (Step S122).

In the case where the pointing target detection unit 1092 detects a candidate target different from the pointing target desired by the user in the concentrated area in Step S122 (Step S122: Yes), the mobile terminal proceeds to F07 in FIG. 632.

In the case where the pointing target detection unit 1092 detects no candidate target different from the pointing target desired by the user in the concentrated area in Step S122 (Step S122: No), the mobile terminal proceeds to Step S123. The movement state detection unit 104 calculates the movement amount of the mobile terminal from when there is concentration of the pointing direction immediately before to when the pointing target is detected (Step S123).

The movement state detection unit 104 then assumes that the entity of the pointing target is present in the concentrated area, and obtains the direction information at the time when the mobile terminal points to the concentrated area (Step S124).

Next, the position correction unit 111 generates coordinates of a provisional pointing target, by adding the movement amount to the position of the pointing target (Step S125).

Next, regarding the obtained direction from the position of the mobile terminal at the time of concentration, the position correction unit 111 calculates an area of a predetermined with on a straight line that is in a direction opposite to the above-mentioned direction and extends from the position of the provisional pointing target in the case where the provisional pointing target is placed in a logical space, as a possible area (Step S126).

The mobile terminal then proceeds to F06 in FIG. 632.

The process shown in FIG. 632 is described next. FIG. 632 shows process flow of correcting the current position information (current position coordinates) to the position in the possible area that is closest to the current position information.

First, the mobile terminal obtains estimated position accuracy information indicating the accuracy of the estimated current position coordinates (Step S127).

Next, the mobile terminal obtains the position accuracy (target position accuracy) of the pointing target (Step S128).

Next, the mobile terminal determines whether or not the estimated position accuracy is high (e.g. equal to or more than 80%) (Step S129).

Next, the mobile terminal increases the width of the possible area according to the largeness of the value of the estimated position accuracy information (Step S130). For example, the mobile terminal calculates "((estimated position accuracy)−80)/10*(width of possible area)", to determine the width of the possible area.

Next, the mobile terminal determines whether or not the position accuracy of the pointing target is low (e.g. equal to or less than 60%) (Step S131).

Next, the mobile terminal increases the width of the possible area according to the smallness of the value of the estimated position accuracy information (Step S132). For example, the mobile terminal calculates "(60−(position accuracy))/10*(width of possible area)", to determine the width of the possible area.

Next, the mobile terminal corrects the current position information to the position in the possible area closest to the current position information (Step S133).

Next, the mobile terminal determines whether or not the function is completed (Step S134). In the case of determining that the function is completed (Step S134: Yes), the mobile terminal ends the process.

In the case of determining that the function is not completed (Step S134: No), the mobile terminal returns to F08 in FIG. 627 and starts the process.

Though the above describes the case where the mobile terminal performs Step S20, i.e. Steps S127 to S132, the mobile terminal may not perform Step S20.

The mobile terminal performs the process as described above.

Though the mobile terminal corrects the current position coordinates (current position) to the coordinates in the calculated possible area that are closest to the current position coordinates, this is not a limit for the present invention. The mobile terminal may correct the current position coordinates to the center of the calculated possible area.

As described above, according to the present invention, it is possible to realize a position estimation device and a position estimation method capable of estimating the position of the position estimation device with high accuracy without requiring installation of special equipment in the building.

Though this embodiment describes the case where the position estimation device 10 includes the acceleration sensor 101, the angular velocity sensor 102, the geomagnetic sensor 103, the movement state detection unit 104, the terminal posture detection unit 105, the position estimation unit 106, the information storage unit 107, the concentration pattern information storage unit 108, the pointing detection unit 109, the concentration calculation unit 110, the position correction unit 111, and the GUI display unit 112, the present invention is not limited to such. As a minimum structure of the position estimation device 10, only a minimum structure unit 10A shown in FIG. 633 needs to be included. FIG. 633 is a functional block diagram showing a minimum structure of a position estimation device according to the present invention. The minimum structure unit 10A of the position estimation device 10 includes the position estimation unit 106, the pointing detection unit 109 including the pointing direction detection unit 1091 and the pointing target detection unit 1092, the concentration calculation unit 110, and the position correction unit 111. The inclusion of at least the minimum structure unit 10A enables the position of the position estimation device 10 to be estimated with high accuracy, without requiring installation of special equipment in the building.

The following cases are also included in the present invention.

(1) Each of the above-mentioned device (apparatus) and terminal is actually a computer system that includes a microprocessor, a ROM, a RAM, a hard disk unit, a display unit, a keyboard, a mouse, and the like. A computer program is stored in the RAM or the hard disk unit. Functions of each device (apparatus) can be achieved by the microprocessor operating in accordance with the computer program. The computer program mentioned here is a combination of a plurality of instruction codes that represent instructions to a computer for achieving predetermined functions.

(2) The components constituting each of the above-mentioned device (apparatus) and terminal may be partly or wholly implemented on one system LSI (Large Scale Integrated Circuit). The system LSI is an ultra-multifunctional LSI produced by integrating a plurality of components on one chip, and is actually a computer system that includes a microprocessor, a ROM, a RAM, and the like. A computer program is stored in the RAM. Functions of the system LSI can be achieved by the microprocessor operating in accordance with the computer program. For example, the integrated circuit includes the movement amount detection unit 104, the terminal posture detection unit 105, the geomagnetic noise detection unit 106, the coordinate estimation unit 107, the geomagnetic noise pattern management unit 108, the geomagnetic noise pattern storage unit 109, and the coordinate correction unit 110.

(3) The components constituting each of the above-mentioned device (apparatus) and terminal may be partly or wholly realized by an IC card or a single module that is removably connectable to the device (apparatus) or terminal. The IC card or the module is a computer system that includes a microprocessor, a ROM, a RAM, and the like. The IC card or the module may include the above-mentioned ultra-multi-functional LSI. Functions of the IC card or the module can be achieved by the microprocessor operating in accordance with the computer program. The IC card or the module may be tamper resistant.

(4) The present invention may also be the method described above. The present invention may also be a computer program that realizes the method by a computer. The present invention may also be a digital signal corresponding to the computer program.

The present invention may also be a computer-readable recording medium, such as a flexible disk, a hard disk, a CD-ROM, an MO, a DVD, a DVD-ROM, a DVD-RAM, a BD (Blu-ray Disc), or a semiconductor memory, on which the computer program or the digital signal is recorded. Conversely, the present invention may be the digital signal recorded on such a recording medium.

The present invention may also be the computer program or the digital signal transmitted via an electric communication line, a wired or wireless communication line, a network such as the Internet, data broadcasting, and the like.

The present invention may also be a computer system that includes a microprocessor and a memory. In this case, the computer program may be stored in the memory, with the microprocessor operating in accordance with the computer program.

The computer program or the digital signal may be provided to another independent computer system by distributing the recording medium on which the computer program or the digital signal is recorded, or by transmitting the computer program or the digital signal via the network and the like. The independent computer system may then execute the computer program or the digital signal to function as the present invention.

(5) The above embodiment and variations may be freely combined.

[Embodiment H]

An embodiment of home appliance touch operation using a mobile terminal such as a smartphone is described below, with reference to FIGS. 634 to 673.

FIGS. 640 and 641 are diagrams showing a structure and a sequence according to this embodiment.

7034 in FIGS. 640 and 7038 in FIG. 641 are each a home appliance that has a proximity communication function. 7035 in FIGS. 640 and 7039 in FIG. 641 are each a mobile terminal such as a smartphone that has the proximity communication function and a general-purpose network communication function and whose functions can be customized by installing various applications. 7036 in FIGS. 640 and 7040 in FIG. 641 are each a server that has the general-purpose network communication function.

FIGS. 647 to 651 are flowcharts showing a procedure according to this embodiment.

This embodiment is described using the flowchart in FIG. 648 below, with reference to FIGS. 634 and 635.

First, the user activates a home appliance touch application on the mobile terminal. The application activated here may be an application occupying the whole screen or an application not explicitly occupying the screen (Step S7100F).

This process corresponds to a screen 7000 and 7002 in FIG. 634. The screen 7000 shows a launcher screen for the application, while 7002 shows a state where the user holds the mobile terminal by the hand and stands near the home appliance. Here, the polling state is OFF, and no communication is performed even when the mobile terminal is brought close to the home appliance.

This process also corresponds to FIG. 635.

A screen 7004 in FIG. 635 shows a launcher screen of the mobile terminal. The home appliance touch application in FIG. 635 runs in the background, and so no UI is explicitly presented in the front of the screen. 7003 shows a state where the user holds the mobile terminal by the hand and is about to touch the home appliance.

Next, the mobile terminal activates the proximity communication function and sets the polling state to ON.

Here, no operation is necessary if the proximity communication function has already been activated (Step S7100G).

This process corresponds to a screen 7001 and 7003 in FIG. 634. The screen 7001 shows that the proximity communication is notified in a pict area.

7003 shows a state where the polling state in the mobile terminal held by the user is ON and the home appliance touch is enabled.

The following describes an embodiment of home appliance touch operation aid using a function of image recognition provided in the mobile terminal such as a smartphone, with reference to the flowchart in FIG. 647 and FIGS. 636, 637, 638, and 639.

First, the user taps a launcher icon of the home appliance touch application.

Here, the polling state of proximity communication (NFC) is OFF for power saving, and no communication is performed even when the mobile terminal is brought close to the home appliance (Step S7100A).

This process corresponds to 7010 and 7013 in FIGS. 636 and 7020 and 7023 in FIGS. 638. 7010 and 7020 show the launcher screen for the application. 7013 and 7023 show a state where the user holds the mobile terminal by the hand and stands near the home appliance. The polling state is OFF, and no communication is performed even when the mobile terminal is brought close to the home appliance.

Next, the mobile terminal activates the home appliance touch application.

For example, the mobile terminal displays "Please touch home appliance" to prompt for touch, and sets the polling state of proximity communication (NFC) to ON.

The mobile terminal activates a camera and captures the target home appliance in the angle of view according to adjustment by the user, and also activates the image recognition function. Here, buttons for selecting the type of home appliance may be presented to the user.

When the user selects a home appliance such as "microwave", the mobile terminal obtains information about "microwave", e.g. pattern information for image recognition, from a server (Step S7100B).

This process corresponds to 7011 and 7014 in FIGS. 636 and 7021 and 7024 in FIG. 638. In 7011 and 7012, a UI for home appliance identification is presented, and also an image obtained by the camera function is presented. 7014 and 7024 show a state where the user holds the mobile terminal and captures the target home appliance in the angle of view of the camera.

If a recognizable home appliance is present in the angle of view of the camera (Step S7100C), the mobile terminal identifies the object of the home appliance captured by the camera using the image recognition function, and presents it to the user (Step S7100D).

This process corresponds to 7012 and 7015 in FIGS. 636 and 7022 and 7025 in FIG. 638. In 7012 and 7022, the object of the home appliance captured by the camera is identified and presented within a box, to notify the user of the object of the home appliance. 7015 and 7025 show a state where image pattern information and the like for the corresponding home appliance are obtained from the server.

In 7015, the user is requested to illuminate an LED lamp, to further enhance the accuracy of aid.

In the case where the user does not touch the home appliance by NFC within a predetermined time period, the procedure returns to Step S7100C.

In the case where the user selects (taps) the object of the home appliance identified by the mobile terminal, the mobile terminal determines the model of the home appliance from the pattern information of the home appliance, identifies the shape and the orientation of the home appliance using the image recognition function, and presents a proximity communication (NFC) transmission and reception unit to the user.

Here, a message prompting to illuminate the power lamp (LED) of the home appliance may be presented to the user so that the user illuminates the LED lamp of the home appliance, thus presenting the proximity communication (NFC) transmission and reception unit with higher accuracy according to the relative distance from the LED lamp.

Moreover, the position of the proximity communication transmission and reception unit of the mobile terminal may also be presented on the screen. A dashed line or a straight line connecting the transmission and reception unit of the mobile terminal and the transmission and reception unit of the home appliance may be presented to prompt the user to easily perform NFC touch more intuitively.

This process corresponds to 7016 and 7018 in FIGS. 637 and 7026, 7031, 7027, and 7032 in FIG. 639.

The screen 7016 shows the identified shape and orientation of the object of the home appliance, and presents the proximity communication (NFC) transmission and reception unit of the object of the home appliance to the user.

7018 shows a state where the user touches the mobile terminal held by the hand to the home appliance. Meanwhile, 7031 shows a state where the user presses the button of the target home appliance according to the instruction in 7022. 7026 shows a state where the camera captures the illumination of the LED of the home appliance and recognizes the LED.

7027 shows the identified shape and orientation of the object of the home appliance, and presents the proximity communication (NFC) transmission and reception unit of the object of the home appliance to the user. 7032 shows a state where the user touches the mobile terminal held by the hand to the home appliance.

The following describes a process of obtaining a home appliance operation application corresponding to the home appliance when the home appliance is touched, with reference to the flowcharts in FIGS. 647, 648, and 649, the screen transition diagrams in FIGS. 635, 637, and 639, FIGS. 640 and 641 showing the structure and the sequence, FIG. 638 showing information held in the mobile terminal, FIG. 643 showing information transmitted by the home appliance, and FIG. 644 showing the case of using NDEF as an example of a data structure in proximity communication.

The proximity communication transmission and reception units of the home appliance and the mobile terminal are brought into proximity to each other within a communicable distance (Step S7100H).

This process corresponds to "activate home appliance touch application" (Step S7037A), "polling" (Step S7037B), and "polling response" (Step S7037C) in the sequence in FIG. 640.

This process also corresponds to "activate home appliance touch application" (Step S7041A), "polling" (Step S7041B), and "polling response" (Step S7041C) in the sequence in FIG. 641.

Upon receiving the notification of proximity communication, the home appliance generates transmission data including an application identifier relating to the home appliance and information relating to the home appliance.

FIG. 643 is a diagram showing an example of the transmission data transmitted to the mobile terminal in 7043.

Though NDEF is applied to the transmission data here, the data may be in a format other than NDEF.

For example in NDEF, the application identifier is encoded as a character string or a byte string for identifying the application, as NDEF Record in NDEF Message. The application identifier may also be a package name used in Java©, or a URL or a URI corresponding to the application.

The information relating to the home appliance may vary depending on the type of home appliance, and may be information used by an application relating to the home appliance.

For example, the information relating to the home appliance may be the model number, product serial number, use history, failure state, and the like of the home appliance, and may be a URL of an e-mail address or a homepage for contacting the manufacturer by the application relating to the home appliance.

7044 in FIG. 644 shows the data structure in NDEF. In detail, 7044 shows the information transmitted by the home appliance in NDEF Message format. 7045 shows the application identifier in NDEF Record format. Likewise, 7046, 7047, 7048, 7049, 7050, and 7051 respectively show the model number, the product serial number, the error code, the use history, the mail address, and the URL in NDEF Record format.

The NDEF Record of the use history 7049 further includes NDEF Records. 7052 shows the inclusion of the time of last use and the use duration each in NDEF Record format (Step S7100I).

This process corresponds to "transmit home appliance information" (Step S7037D, 7041D) in the sequence shown in FIGS. 640 and 641.

Next, the mobile terminal receives the transmission data generated by the home appliance using proximity communication, and expands the data in a memory in the terminal (Step S7100J).

This process corresponds to "transmit home appliance information" (Step S7037E, S7041E) in the sequence in FIGS. 640 and 641.

The mobile terminal closely examines the obtained home appliance information (Step S7100K).

The mobile terminal first searches for the application identifier relating to the home appliance, and reads the application identifier (Step S7100L).

The mobile terminal checks whether or not the application corresponding to the applicant identifier is already present in the mobile terminal (Step S7100M).

In the case where the application is not present, the mobile terminal proceeds to Step S71000. In the case where the application is present, the mobile terminal proceeds to Step S7100R.

The mobile terminal logs into the server using server specific information held in the mobile terminal.

7042 in FIG. 642 shows an example of the information held in the mobile terminal. 7042 includes the server specific information.

Here, the server specific information includes the URL, account ID, and account password of the server.

A service ID for identifying a service or a provider ID for specifying a service provider may further be used other than the account ID.

The process of logging into the server may be omitted if the mobile terminal has already logged into the server and obtained an account token from the server (Step S71000).

This process corresponds to "access URL in server specific information" (Step S7041F), "log into server using server specific information held in mobile terminal" (Step S7041G), and "notify connection to server" (Step S7041H) in the sequence in FIG. 641.

The mobile terminal registers the home appliance information into the server, using the token obtained in the login process.

Here, the information of the mobile terminal such as the model number, the product serial number, and the position information may be transmitted together with the home appliance information (Step S7100P).

This process corresponds to "register home appliance information" (Step S7041I) in the sequence in FIG. 641.

The server searches for and prepares the application corresponding to the application identifier in the home appliance information, and the mobile terminal starts downloading the application.

Here, the mobile terminal may inquire of the user whether or not to download the application, by pop-up or the like (Step S7100Q).

This process corresponds to "download home appliance operation application" (Step S7041G) in the sequence in FIG. 641.

The mobile terminal activates the application corresponding to the application identifier (Step S7100R).

This process corresponds to "activate home appliance application" (Step S7041K) in the sequence in FIGS. 640 and 641.

This process also corresponds to 7005, 7017, and 7028 in the screen transition diagrams in FIGS. 635, 637, and 639, respectively. 7005, 7017, and 7028 equally show a screen corresponding to the home appliance presented by the home appliance operation application. 7009, 7019, and 7033 show a state where the user holds the mobile terminal by the hand and touches the home appliance, and the mobile terminal obtains, based on the information obtained by proximity communication, the data and application necessary for presenting the information of or operating the home appliance.

The mobile terminal notifies the activated application corresponding to the application identifier, of the home appliance information in the transmission data from the home appliance (Step S7100S).

The mobile terminal notifies the activated application corresponding to the application identifier, of the home appliance information such as the model number, the product serial number, the error code, the use history, the mail address, and the URL other than the application identifier in 7043 in FIG. 643.

The activated application corresponding to the application identifier performs processes corresponding to the type of home appliance, using the notified home appliance information. For example, the application has the mobile terminal store the model number, the product serial number, and the failure state as the position of the home appliance together with the position information held in the mobile terminal.

This enables the mobile terminal to recognize the position of each touched home appliance (Step S7100T).

A home appliance list of home appliances and their position information is generated and updated using the obtained home appliance information, the position information held in the mobile terminal, and an area list based on room arrangement information.

The following describes a procedure of generating and updating such a home appliance list, using the flowcharts in FIGS. 650 and 651, FIG. 642 showing the information held in the mobile terminal, FIG. 643 showing the information transmitted by the home appliance, FIG. 645 showing the area list based on the room arrangement information, FIG. 646 showing the home appliance list of home appliances and their position information held in the mobile terminal, and the screen transition diagrams in FIGS. 635, 637, and 639.

The following describes the process in the flowchart in FIG. 650 in sequence.

The mobile terminal checks whether or not the touched home appliance is already registered.

In detail, the mobile terminal performs the check, by comparing the model number and the product serial number 7043 in the home appliance information with the model number and the product serial number in the home appliance list 7056 held in the mobile terminal (Step S7100T).

In the case where the entry of the same model number and product serial number is not included in the home appliance list, the mobile terminal proceeds to Step S7100W.

In the case where the entry of the same model number and product serial number is included in the home appliance list, the mobile terminal proceeds to Step S7100U.

The mobile terminal newly adds the touched home appliance to the home appliance list 7056.

Here, the mobile terminal may inquire of the user whether or not to add the home appliance, by pop-up function or screen presentation (Step S7100W).

This process corresponds to 7006, 7016, and 7029 in the screen transition diagrams in FIGS. 635, 637, and 639, showing a screen inquiring of the user about additional home appliance registration.

The mobile terminal registers the position information associated with the newly registered home appliance, into the home appliance list 7056.

The position information mentioned here is the position information and the accuracy identifier in the information 7042 held in the mobile terminal at the time of touch.

The mobile terminal may inquire of the user whether or not to register the position information of the home appliance, by pop-up function or screen presentation (Step S7100X).

This process corresponds to 7007, 7017, and 7030 in the screen transition diagrams in FIGS. 635, 637, and 639, showing a screen inquiring of the user about home appliance position information registration.

In the case where the entry of the same model number and product serial number is included in the home appliance list in Step S7100T, the mobile terminal compares the position information associated with the touched home appliance, with the position information of the same model number and product serial number registered in the home appliance list 7056.

The position information mentioned here is the position information in the information 7042 held in the mobile terminal at the time of touch.

In the case where the position information does not match, the mobile terminal proceeds to Step S7100V. In the case where the position information matches, the mobile terminal proceeds to Step S7100Y in FIG. 651.

The mobile terminal compares the accuracy identifier registered in association with the position information between the touched home appliance and the entry in the home appliance list 7056. In the case where the accuracy identifier of the touched home appliance is higher, the mobile terminal updates the position information and the accuracy identifier of the entry in the home appliance list 7056.

The position information mentioned here is the position information in the information 7042 held in the mobile terminal at the time of touch.

The mobile terminal may inquire the user whether or not to update the position information of the home appliance, by pop-up function or screen presentation (Step S7100V).

The mobile terminal compares the position information of the newly registered home appliance, with the area list 7055 held in the mobile terminal.

7055 in FIG. 646 shows an example of the area list.

The area list 7055 is a list calculated from a 3D map of the room arrangement information obtained by the mobile terminal beforehand. Each entry is defined by a vertex (eX, eY, eZ) and a depth (eD), a width (eW), and a height (eH) from the vertex, and defines a type (G: group (further including entry), T: termination (not including entry)) for identifying whether or not the area defined in the entry includes another entry and, in the case where the area belongs to an area defined in another entry, the belonging area (Step S7100Y).

The mobile terminal compares the coordinates (X, Y, Z) of the newly registered home appliance, respectively with the coordinates (eX, eY, eZ) of the area and the depth (eD), the width (eW), and the height (eH) of the area in the area list. In the case where $eX<X<eX+eD$, $eY<Y<eY+eW$, and $eZ<Z<eZ+eH$, the mobile terminal registers its area identifier into the home appliance list, as the belonging group (Step S7100Z).

In the case where the area of the compared entry in the area list is not the termination (i.e. containing other area), the mobile terminal performs comparison with any other uncompared entry in the area list.

In the case where the area of the compared entry in the area list is the termination (i.e. not containing other area) or in the case where the comparison with all entries is completed, the mobile terminal ends the process of generating and updating the home appliance list of home appliances and their position information using the home appliance information, the position information held in the mobile terminal, and the area list based on the room arrangement information.

The embodiment described above produces the following advantageous effects.

(1) The user's operation when performing proximity communication using image recognition which is one of the functions of the mobile terminal can be aided, thus easing the user's operation.

(2) The application for operating the target home appliance touched by the user can be easily obtained, without the user having to perform excess button operations or tapping.

(3) The position information of the touched target home appliance can be grouped with group attributes according to the room arrangement information. This enables group-based operation when using the home appliance operation application.

[Embodiment I]

An embodiment of home appliance operation using position information by a mobile terminal such as a smartphone is described below, with reference to FIGS. 652 to 663.

This embodiment is realized based on the structure of Embodiment H, and the functions, structural elements, data structures, and the like shown in Embodiment H equally apply to this embodiment.

FIG. 652 is a diagram showing a structure according to this embodiment.

7150 in FIG. 652 shows the inside of the home, which is defined as a range where communication with a wireless LAN/home server shown by 7157 is possible.

7151 is a server outside 7150, i.e. outside the home, and is located on a general-purpose network. The server 7151 communicates with mobile terminals 7154 and 7155 via a wireless communication device 7153. The wireless communication device 7153 may be a 3G network device or a public wireless LAN.

Other wide-area wireless communication is also applicable. The wireless communication device 7153 is also communicable within the home 7150.

7152 is a database used in this embodiment.

The service server 7151 holds the room arrangement information, the area list 7055, and the home appliance list 7056 corresponding to the mobile terminal, in the database 7152.

7154 and 7155 are mobile terminals used in this embodiment. These mobile terminals have a proximity wireless communication function, and are capable of communicating with a reference board 7155 and a contactless charger 7159, and also capable of communicating with the service server 7151 via the wireless communication device 7153 and with the wireless LAN/home server 7157.

The wireless LAN/home server 7157 has a database 7158.

The home server 7157 holds the room arrangement information, the area list 7055, and the home appliance list 7056 corresponding to the mobile terminal, in the database 7158.

FIG. 653 is a diagram showing the display of the screen of the mobile terminal when starting the use of the home appliance operation application and the relationships between the peripheral appliances and the structure according to this embodiment including a bird's eye view, in the case of implementing this embodiment.

7160 is the bird's eye view from above the home when implementing this embodiment. 7161 is the reference board touched when starting the use of the home appliance operation application in the mobile terminal. 7162 is the wireless LAN/home server for providing the service in the home according to this embodiment. 7163 is the contactless charger that supplies power to the mobile terminal for charging, connects to the wireless LAN/home server, and is touched when starting the use of the home appliance operation application in the mobile terminal as with the reference board.

7164 shows a state where the user holds the mobile terminal by the hand and touches the reference board 7161.

7165 and 7166 are respectively a gate light and an entrance light each of which is a home appliance to be operated in this embodiment. In this embodiment, home appliances can be operated in units of groups. 7167 is the second floor in the home, while 7168 is the first floor in the home. In this embodiment, it is possible to operate a set of home appliances on the first floor and a set of home appliances on the second floor each as a group.

FIG. 654 is a diagram showing the display of the screen of the mobile terminal during the use of the home appliance operation application and the relationships between the peripheral appliances and the structure according to this embodiment including a bird's eye view, in the case of implementing this embodiment.

Since 7160' to 7168' are the same as those in FIG. 653, their description is omitted.

FIGS. 659 to 663 are flowcharts showing a procedure according to this embodiment.

First, the process of starting the home appliance operation application using the reference board 7161 in FIG. 653 is described in sequence below, with reference to the flowchart in FIG. 659.

First, the user activates the home appliance operation application on the mobile terminal.

The application activated here may be an application occupying the whole screen or an application not explicitly occupying the screen (Step S7200A).

Next, the mobile terminal activates the proximity communication function and sets the polling state to ON.

Here, no operation is necessary if the proximity communication function has already been activated (Step S7200B).

The proximity communication transmission and reception units of the mobile terminal and the reference board 7161 which is installed at the entrance or the gate, has a key function, and includes a proximity communication transmission and reception unit are brought into proximity to each other within a communicable distance (Step S7200C).

The mobile terminal and the reference board 7161 authenticate each other as a valid terminal (terminal authentication).

Here, the reference board operates with power supplied from the mobile terminal (Step S7200D).

7169 in FIG. 650 shows a state where the terminal authentication is performed.

In the case where the terminal authentication is successful, the mobile terminal proceeds to Step S7200E.

In the case where the terminal authentication fails, the mobile terminal notifies the user of the failure, and the application ends.

In the case where the terminal authentication is successful in Step S7200D, the mobile terminal checks whether or not the user is authenticated. The mobile terminal may perform user authentication by presenting a screen for the user to enter a passphrase stored beforehand for user authentication and prompting the user to enter the passphrase.

Alternatively, the mobile terminal may perform user authentication by presenting a screen for the user to enter biometric information such as fingerprint information registered beforehand by the user and prompting the user to enter the biometric information.

7170 in FIG. 650 shows a screen for the user to perform user authentication.

In the case where the user authentication is successful, the mobile terminal proceeds to Step S7200F. In the case where the user authentication fails, the mobile terminal notifies the user of the failure, and the application ends.

The mobile terminal transmits a user authentication completion notification and an unlock request, to the reference board 7161 (Step S7200F).

Upon receiving the authentication completion notification, the reference board 7161 determines whether or not power is supplied to the circuit of the reference board 7161, whether or not the wireless LAN access point in the home is powered ON, and whether or not the home server is activated (Step S7200G).

In the case where the circuit of the reference board 7161 is supplied with power and the wireless LAN access point in the home is powered ON, the reference board 7161 proceeds to Step S7200I. In the case where the circuit of the reference board 7161 is not supplied with power or the wireless LAN access point in the home is not powered ON, the reference board 7161 proceeds to Step S7200H.

In the case where the circuit of the reference board 7161 is not supplied with power or the wireless LAN access point in the home is not powered ON, the reference board 7161 requests the wireless LAN access point in the home and the home server to activate and supply power to the reference board 7161 (Step S7200H).

When the power supply to the reference board 7161 and the activation of the home server are successful, the reference board 7161 proceeds to Step S7200I.

When the power supply to the reference board 7161 or the activation of the home server fails, the reference board 7161 proceeds to Step S7203A in FIG. 662.

The reference board 7161 notifies the home server of an unlock enable request together with the ID of the mutually authenticated mobile terminal in encrypted form (Step S7200I).

The ID of the mobile terminal may be the product serial number of the mobile terminal, or the result of applying a hash function of a predetermined algorithm.

The home server determines whether or not the received ID of the mobile terminal is a registered ID, and notifies the reference board of an unlock instruction (Step S7200J).

The home server holds an unlock table 7182 in FIG. 658, in the database 7158. The home server references to this unlock table 7182, to check whether or not the notified mobile terminal ID matches an unlock enable mobile terminal ID capable of unlocking the key of the ID of the key function-equipped reference board.

In the case where the mobile terminal ID is not the unlock enable mobile terminal ID, the home server notifies this to the mobile terminal via the reference board, and the application ends. Here, the application may notify the user that the key does not match.

The reference board performs the unlock process, and notifies the mobile terminal of the address of the home server, the position information of the reference board, and the unlock (Step S7200K).

In this way, the user can achieve the unlock using the reference board, and also complete the home appliance operation application start process using the home position information.

The process when the area list is to be updated is described below, with reference to FIG. 661.

Once the home appliance operation application start process is completed, the mobile terminal updates the position information in the mobile terminal to the position of the reference board 716, and obtains the room arrangement information, the area list, and the home appliance list in the home from the home server. The mobile terminal may update the area list based on the room arrangement information.

The area list is a list calculated from a 3D map of the room arrangement information obtained by the mobile terminal. Each entry is defined by a vertex and a depth, a width, and a height from the vertex, and defines a type for identifying whether or not the area defined in the entry includes another entry and, in the case where the area belongs to an area defined in another entry, the belonging area (Step S7202A).

When the area map is updated, the mobile terminal notifies the home server of the updated area list, to synchronize the area list with the home server (Step S7202B).

The process in the case where the reference board is not supplied with power and the home server is not activated in Step S7200H is described in sequence below, with reference to FIG. 663.

The reference board 7161 notifies that the unlock cannot be performed automatically, and the URL of the service server 7151 outside the home, to the mobile terminal.

Here, the reference board 7161 may transmit a certificate for server authentication of the service server 7151 (Step S7202A).

The mobile terminal connects to the service server 7151 with the URL obtained from the reference board 7161, and logs into the system. The mobile terminal and the service server 7151 are connected by SSL communication.

The certificate obtained from the reference board 7161 may be used for server authentication. To log into the system, a passphrase obtained by the user authentication may be used. In the case of using biometric authentication for the user authentication, a finite number of digits of alphametric characters obtained by the biometric authentication may be used. Moreover, a new security number may be set to log into the server. In such a case, the user is prompted to input the security number upon login (Step S7202B).

The mobile terminal encrypts and transmits the ID of the mobile terminal, the ID of the reference board 7161, and the unlock request, to the service server 7151.

The ID of the mobile terminal and the ID of the reference board may each be the product serial number of the device, or the result of applying a hash function of the same algorithm to the product serial number (Step S7202C).

The service server 7151 determines whether or not the obtained ID of the mobile terminal and ID of the reference board are an unlock enable pair (Step S7202D).

The service server 7151 holds the unlock table 7182 in FIG. 655, in the database 7152. The service server 7151 references to the unlock table 7182, and checks whether or not the received pair of the ID of the reference board and the ID of the mobile terminal match the pair of the ID of the key function-equipped reference board and the unlock enable mobile terminal ID.

In the case where there is no matching pair, the service server 7151 proceeds to Step S7202E. In the case where there is a matching pair, the service server 7151 proceeds to Step S7202G.

In the case where there is no matching pair in Step S7202D, the service server 7151 returns an unlock disable notification to the mobile terminal (Step S7202E).

The mobile terminal presents unlock disable information on the screen (Step S7202F).

In the case where there is a matching pair in Step S7202D, the service server 7151 returns an unlock enable notification to the mobile terminal (Step S7202G).

Upon receiving the unlock notification, the mobile terminal switches to a forced unlock mode, and notifies the reference board 7161 of a manual unlock request (Step S7202H).

Upon receiving the manual unlock request, the reference board 7161 changes lock control to manual unlock, with power obtained via the proximity communication with the mobile terminal (Step S7202I).

When the user rotates the handle of the gate or the doorknob of the entrance, the reference board 7161, which has a power generator equipped at the rotary shaft of the handle of the gate or the doorknob of the entrance, unlocks the key with power generated by rotation (Step S7202J).

The reference board 7161 notifies the mobile terminal of the position information of the reference board and the unlock (Step S7202K).

Upon receiving the position information of the reference board and the unlock notification from the reference board 7161, the mobile terminal updates the position information in the mobile terminal to the position of the reference board, and obtains the room arrangement information, the area list 7055, and the home appliance list 7056 in the home from the service server 7151. The mobile terminal then proceeds to Step S7204A in FIG. 663.

The home appliance operation application start process on the mobile terminal using the contactless charger 7163 is described in sequence below, with reference to FIG. 660.

The user activates the home appliance operation application on the mobile terminal.

The application activated here may be an application occupying the whole screen or an application not explicitly occupying the screen (Step S7201A).

Next, the mobile terminal activates the proximity communication function and sets the polling state to ON.

Here, no operation is necessary if the proximity communication function has already been activated (Step S7201B).

The proximity communication transmission and reception units of the mobile terminal and the contactless charger 7163 which is connected to the home server via a network and includes a proximity communication transmission and reception unit are brought into proximity to each other within a communicable distance (Step S7201C).

When the polling state is ON and the mobile terminal and the contactless charger 7163 are within the communicable distance, the mobile terminal and the contactless charger 7163 first authenticate each other as a valid terminal (terminal authentication) (Step S7201D).

In the case where the terminal authentication fails, the mobile terminal notifies the user of the failure, and the application ends. In the case where the terminal authentication is successful, the mobile terminal proceeds to Step S7201E.

In the case where the terminal authentication is successful, the mobile terminal checks whether or not the user is authenticated. The mobile terminal may perform user authentication by presenting a screen for the user to enter a passphrase stored beforehand for user authentication and prompting the user to enter the passphrase.

Alternatively, the mobile terminal may perform user authentication by presenting a screen for the user to enter biometric information such as fingerprint information registered beforehand by the user and prompting the user to enter the biometric information (Step S7201E).

In the case where the user authentication fails, the mobile terminal notifies the user of the failure, and the application ends. In the case where the user authentication is successful, the mobile terminal proceeds to Step S7201F.

In the case where the user authentication is successful, the mobile terminal transmits a user authentication completion notification to the contactless charger 7163 (Step S7201F).

Upon receiving the user authentication completion notification, the contactless charger 7163 notifies the mobile terminal of the address of the home server and the position information of the contactless charger (Step S7201G).

With the above procedure, the home appliance operation application start process can be carried out using the contactless charger.

The method of grouping home appliances using the room arrangement information and the position information and presenting home appliances by the mobile terminal according to this embodiment is described below, with reference to the flowchart in FIG. 663, FIG. 654 showing the relationship between the UI during the use of the home appliance operation application and the structure of this embodiment, FIGS. 652 and 653 showing screen transition in the grouped home appliance menu operation, and FIG. 654 showing the room arrangement information and the UI screen in the case where the home appliance operation application is used on the mobile terminal in each area.

After the home appliance operation application start process is performed using the key-equipped reference board or the contactless charger, the mobile terminal enters a home appliance operable state.

When the mobile terminal is tilted toward inside the home in this state, the mobile terminal arranges menus of home appliances closer to the current position to the front on the screen and menus of home appliances farther from the current position to the back on the screen (and equally arranges menus of home appliances on the right of the current position to the right on the screen and menus of home appliances on the left of the current position to the left on the screen) from among the home appliances in the home appliance list, based on the held home appliance position data.

The mobile terminal determines which area in the area list 7055 the current position information belongs to, and presents menus of home appliances that belong to a group corresponding to the area.

The mobile terminal presents not only a menu of each individual home appliance but also a menu of a list of home appliances registered in a group as one menu, in the same manner as other home appliances.

In the grouped menu, one or more home appliances may be referenced to from outside the group, as external public registered home appliances (Step S7024A).

7171 in FIG. 654 shows a screen corresponding to this process, i.e. a screen when the mobile terminal is tilted toward the main entrance from outside the gate in front of the gate light.

On the screen 7171 in FIG. 654, the frontmost gate light 7165' is displayed in the front, while the entrance light 7166' in front of the building is displayed behind the gate light 7165'.

Moreover, on the screen 7171 in FIG. 654, the home appliance group included in the first floor 7168' is displayed behind the entrance light 7166', and the home appliance group included in the second floor 7167' is displayed above the home appliance group of the first floor 7168'. "Floor light model: FSA9999" is registered as an external public registered home appliance of the group of the second floor 7167', on the screen 7171 in FIG. 654.

Step S7204A is repeated in the case where the user moves and the position of the mobile terminal changes or in the case where the user changes the angle of the mobile terminal.

FIG. 654 shows an example of the screen of the mobile terminal in the case where, in certain room arrangement, the user moves and as a result the position of the mobile terminal changes or the user changes the angle of the mobile terminal. 7178 is a bird's eye view of the first floor in Matsushita's house from above.

7179, 7180, and 7181 respectively show the screens when the home appliance operation application is used in three positions 7183 (circle 1), 7184 (circle 2), and 7185 (circle 3).

In 7183 (circle 1), an electric kettle and a microwave are located from the front left as individual home appliances, and a living room is located forward. Accordingly, a menu of the electric kettle is displayed in the front, a menu of the microwave is displayed behind the menu of the electric kettle, and a menu of grouped living room home appliances is displayed behind the menu of the microwave.

As a result of moving to the position 7184 (circle 2), the mobile terminal is currently in the living room, and so can operate the menus of the living room home appliances directly.

A TV and an air conditioner are located from the front right as individual home appliances. Since there is a bedroom on the left, bedroom home appliances are presented as a group.

The user then moves to the position 7185 in circle 3. Though there is an air conditioner in the bedroom, it is located behind the user. Accordingly, the air conditioner is not presented as a menu of the mobile terminal. Meanwhile, a TV is located on the left. Besides, since the user moves into the bedroom away from the living room, the menu of the living room home appliance group is presented.

Thus, the menus of individual home appliances and home appliance groups presented on the screen are dynamically updated depending on the position of the mobile terminal.

Such a mechanism can provide a more intuitive, user-friendly home appliance operation application.

In the case where the user taps (selects) a menu of a home appliance, the mobile terminal presents the menu of the home appliance tapped by the user in the front of the screen (Step S7204B).

This process corresponds to the operation from 7172 to 7173 in FIG. 652 and the operation from 7175 to 7176 in FIG. 653.

In FIG. 652, "entrance light" behind "gate light" is tapped, as a result of which "entrance light" is displayed in the front. In FIG. 653, "second floor home appliance" behind "entrance light" is tapped, as a result of which "second floor home appliance" is presented in the front.

When the user operates the home appliance menu (Step S7204B), the mobile terminal notifies the target home appliance of the operation instructed by the user (Step S7204E).

When the user double-taps the menu or taps the lock button (Step S7204B), the mobile terminal activates the operation application of the target home appliance and presents it on the whole screen (Step S7204C).

This process corresponds to the operation from 7173 to 7174 in FIG. 652 and the operation from 7176 to 7177 in FIG. 653.

In FIG. 652, the menu of "entrance light" already displayed in the front is double-tapped to lock the menu in the front, and the operation menu of the target home appliance is presented on the whole screen. The operation menu of "entrance light" displayed here enables more detailed operations (light control) than when the menu is presented as one part of the screen.

In FIG. 653, the menu of "second floor home appliance" already displayed in the front is double-tapped to lock the menu in the front, and the operation menu of the home appliance group is presented on the whole screen. Here, not only the external public registered home appliance but a button such as "other home appliance" may be presented to the user so that any other home appliance in the group can be called from the menu.

By double-tapping the home appliance operation menu presented on the whole screen again, pressing the unlock button, or pressing the return button on the mobile terminal, the whole screen occupation or whole screen lock state of the home appliance operation menu is cleared.

The operation of switching to the whole screen display is not limited to double-tap, and may be a long press on the menu, a trigger (gesture) by rapid acceleration detection, a software or hardware dedicated button, a shared button, and the like.

With the above procedure, the method of grouping home appliances using the room arrangement information and the position information and presenting intuitive, easily understandable home appliance menus can be achieved. This enables a more user-friendly home appliance operation application to be provided.

[Embodiment J]

This embodiment describes a method of, in the case where a peripheral appliance (device, apparatus) of the user, typically a home appliance in a home, needs to notify the user of information due to a failure or a state change, notifying the information at low cost without particularly using an expensive module such as a display.

Most home appliances such as an air conditioner and a TV provide some kind of information to the user using an LED (Light Emitting Diode).

For example, information such as normal operation when the LED is illuminating in green color and abnormality when the LED is blinking in red color is sent to the user. In this case, however, the user needs to read an operating manual or the like beforehand to determine the information by observing the illumination state of the LED.

A method of obtaining information transmitted from the peripheral appliance by sensing the light emitting pattern of the LED through the use of a mobile terminal such as a smartphone held by the user is disclosed here.

FIG. 664 is a diagram showing an example of a communication situation by optical communication according to this embodiment.

As shown in FIG. 664, a camera of a mobile terminal is pointed to an LED of a TV. At this time, the TV is outputting information to be transmitted, by modulating the information to the light emitting pattern of the LED. The mobile terminal obtains the light emission pattern of the LED such as blinking by an imaging device of the camera and demodulates the signal, as a result of which the mobile terminal can extract the modulated information. The mobile terminal notifies the extracted information to the user. Hence, the user can obtain more information from the LED than when the user visually observes the state of the LED. Though the camera is mainly used for sensing, a diode capable of reception in optical communication, such as a photodiode, may also be used.

FIG. 665 is a diagram showing a structure of the mobile terminal according to this embodiment.

As shown in FIG. 665, the mobile terminal in this embodiment includes a camera 6301, an acceleration sensor 6032, an angular velocity sensor 6303, a geomagnetic sensor 6304, an LED blinking pattern analysis unit 6305, a terminal posture and terminal movement amount detection unit 6306, an optical communication information obtainment unit 6307, a peripheral appliance limiting unit 6308, a peripheral appliance information storage unit 3609, a position information calculation unit 6310, a server cooperative communication unit 6311, and a UI display unit 6312.

The peripheral appliance information storage unit 6309 stores information of home appliances in the home and the like, including appliance IDs and installation position information. Information such as accuracy identifiers of the position information, appliance attributes, and installation orientations may also be stored.

The angular velocity sensor and the geomagnetic sensor may both be used for calculating posture information of the mobile terminal, but the present invention can still be realized using one of the angular velocity sensor and the geomagnetic sensor. Though the above structure is employed in this embodiment, the present invention is not limited to such a structure. For example, in the case of not performing server cooperation, the structure may be modified in such a manner that information corresponding to the server is stored in the mobile terminal. A dedicated light receiving unit such as a photodiode may be included instead of the camera 6301.

As shown in FIG. 666, a peripheral appliance such as an air conditioner or a TV transmits information of the peripheral appliance, using an optical communication technology of communicating information by changing a light emitting pattern in visible light communication and the like. The user obtains information transmitted via optical communication, using the camera of the mobile terminal. As an example, in the case where filter cleaning of an air conditioner is necessary, the obtained data includes ID information using the model number of the peripheral appliance or the like, and error code indicating the necessity of filter cleaning. The mobile terminal may display these information directly to the user. However, a more easily understandable user interface can be realized by accessing, according to need, a server (a server for customer support managed by the manufacturer of the air conditioner or the like is assumed here) on a cloud, downloading a corresponding richer GUI, application, support site access information, and the like, and presenting them to the user.

FIG. 667 is a diagram showing an example of information transmitted by the peripheral appliance via optical communication. Not only the appliance ID and the error code but also the appliance name, the installation position information of the appliance set beforehand, and the like may be included in the transmission information. These information can be used for information presentation to the user, search on the cloud, and correction of the position information in the mobile terminal. Especially, since the position in which information of optical communication output from the LED of the peripheral appliance can be obtained is limited, if the mobile terminal can obtain the information, then the mobile terminal is in the limited position. In the case where the mobile terminal is not in the position, the position is corrected.

FIG. 668 is a diagram showing an example of communication between the user position and the peripheral appliance by optical communication in a map assuming the inside of the home. Here, the peripheral appliances from which information can be obtained by optical communication can be narrowed down according to the position of the user carrying the mobile terminal. For instance, in the position of the coordinates (X0, Y0, Z0), an air conditioner, a TV, and a video recorder are present in the traveling direction of the user, so that a menu of "TV", "video recorder", "air conditioner", and "other" in consideration of other possibilities is displayed as in a screen example 6330 of the mobile terminal. After this, when the user moves to the coordinates (X1, Y1, Z1), only the air conditioner is subjected to communication, so that a menu of "air conditioner" and "other" is displayed as in a screen example 6331 of the mobile terminal.

Further, when the user is at the coordinates (X5, Y5, Z5), a menu of "TV" and "other" is displayed as in a screen example 6332 of the mobile terminal. Thus, the peripheral appliances can be narrowed down according to the position and traveling direction of the user. This contributes to more user-friendly information presentation. Besides, since the appliance candidates have already been narrowed down upon information obtainment by optical communication, information can be complemented promptly. This is advantageous in that no only information can be promptly presented to the user but also additional information can be included.

The following describes process flow. The process flow starts from FIG. 669.

In Step S6301*a*, the mobile terminal measures the movement amount of the mobile terminal from the information obtained by the acceleration sensor, the geomagnetic sensor, and the angular velocity sensor, estimates the position of the mobile terminal, and holds the estimated position as the coordinates (X, Y, Z).

In Step S6301*b*, the mobile terminal detects the traveling direction of the user, from the traveling direction of the movement direction of the mobile terminal.

In Step S6301*c*, the mobile terminal activates the optical communication application of the user terminal, and displays the UI to point the camera of the mobile terminal to the activated appliance (in the case where the mobile terminal includes an optical communication module having an optical communication reception function such as an optical communication diode, displays the UI to point the module to the activated appliance).

In Step S6301*d*, the mobile terminal references to the peripheral appliance position information list based on the current position and posture information of the mobile terminal, and obtains a list of appliances near the user.

In Step S6301*e*, the mobile terminal displays a screen for selection from the appliance list and other appliances, to the user.

In Step S6301*f*, the mobile terminal determines whether or not no button is pressed and the terminal posture is changed so that the camera is closer to the horizontal direction (sensor detection).

In the case where the determination results in Yes, the mobile terminal proceeds to Step S6301*g* and displays the UI for the user to point the mobile terminal to the target appliance.

In Step S6301*h*, the mobile terminal activates the optical communication information obtainment function by the camera, and proceeds to F6301.

In the case where the determination in Step S6301*f* results in No, the mobile terminal proceeds to Step S6301*i*, and determines whether or not the button for selecting any other appliance is pressed. In the case where the determination results in Yes, the mobile terminal proceeds to Step S6301*g*.

In the case where the determination results in No, the mobile terminal proceeds to Step S6301*j*, and displays the appliance information, the position of the optical communication light-emitting unit, and the maximum time period for which the camera needs to be pointed for information obtainment. The mobile terminal then proceeds to Step S6301*h*.

The peripheral appliances are narrowed down to one using the position information of the mobile terminal in Step S6301*d*, and the action of the user holding the mobile terminal over the target peripheral appliance is detected in Step S6301*f*. In this way, the information obtainment by optical communication can be started while saving the user the trouble of performing an operation such as button press.

The following describes FIG. 670.

In Step S6311*a* from F6301, the mobile terminal determines whether or not the mobile terminal can specify the target appliance (including the case where the target appliance is known beforehand) and obtain the necessary information (e.g. error code) outputted from the target appliance (if information displayable to the user can be obtained during the obtainment process, the information may be displayed sequentially).

In the case where the determination results in Yes, the mobile terminal proceeds to Step S6311*b*. The mobile terminal transmits the ID of the target appliance and the obtained information to the server on the cloud, and downloads the corresponding user presentation information (the server on the cloud corresponds to a support site in which the user is registered, a manufacturer support site determined based on the appliance ID, or the like).

In Step S6311*c*, in the case where the obtained user presentation information is URL, the mobile terminal accesses the website. In the case where the obtained user presentation information is text, image, application, or the like, the mobile terminal displays the text, image, application, or the like.

In Step S6311*d*, in the case where the target appliance needs handling for a failure, filter replacement, or the like, the mobile terminal presents the handling method to the user.

In Step S6311*e*, the mobile terminal determines whether or not the user selects to order the component.

In the case where the determination results in Yes, the mobile terminal proceeds to Step S6311*f*, and determines whether or not the mobile terminal has already authenticated the current user as the user. In the case where the determination results in Yes, the mobile terminal proceeds to Step S6311*g* and to F6302.

In the case where the determination in Step S6311*a* results in No, the mobile terminal returns to Step S6311*a*.

In the case where the determination in Step S6311*e* results in No, the mobile terminal proceeds to F6302.

In the case where the determination in Step S6311*f* results in No, the mobile terminal proceeds to Step S6311*h*, and displays the UI for the user to touch the mobile terminal to a card (available for billing such as a credit card) for NFC. The mobile terminal then proceeds to Step S6311*g*.

Thus, the mobile terminal obtains the support information based on the information obtained by optical communication, and also performs the user authentication process necessary for billing. This saves the user the trouble of performing operations other than the process using the mobile terminal, which contributes to improved convenience. Moreover, problems such as input error in ordering components can be prevented.

The following describes FIG. 671.

In Step S6321*a* from F6302, the mobile terminal determines whether the user performs the work or requests for support by professional staff as a result of the user selection.

In the case where the user performs the work, the mobile terminal proceeds to F6303.

In the case where the user requests for support, the mobile terminal proceeds to Step S6321*b*, and inquires of each peripheral appliance whether or not support for a failure or consumable item replacement is needed, by wireless communication.

In Step S6321*c*, in response to the inquiry, the peripheral appliance notifies the mobile terminal of the appliance ID and the component ID in the case where any consumable item is approaching the time for replacement.

In Step S6321*d*, the mobile terminal inquires of the user whether or not to replace the component of the other appliance as notified from the other appliance, and searches for each support center that is situated near the user's home (support target appliance) and is capable of providing all supports and components necessary for the support requests acknowledged by the user (the user inputs "YES").

In Step S6321*e*, the mobile terminal displays a map, and displays the use history of the user, the position, and the past delivery time history of each of the top five support centers near the user's home found as a result of the search.

In Step S6321*f*, the mobile terminal issues a request (appliance list, consumable item, use history) to the target support center selected by the user.

In Step S6321*g*, the mobile terminal determines whether or not the support staff has arrived.

In the case where the determination in Step S6321*g* results in Yes, the mobile terminal proceeds to F6304. In the case where the determination in Step S6321*g* results in No, the mobile terminal returns to Step S6321*g*.

The following describes FIG. 672.

In Step S6331*a* from F6303, the mobile terminal displays the work procedure and ends the application.

In Step S6331*b*, the mobile terminal determines whether or not the component has been delivered to the user.

In the case where the determination in Step S6311*b* results in Yes, the mobile terminal proceeds to Step S6331*c*. If the RFID is present on the box of the component, the user touches the mobile terminal to the RFID.

In Step S6331*d*, the mobile terminal displays the work procedure and the target appliance name.

In Step S6331*e*, in the case where the mobile terminal can check the state of the target appliance by optical communication during the procedure, the mobile terminal notifies the user and enters the camera mode (in the case where the optical communication module is included, activates the optical communication module).

In Step S6331*f*, after the work completion, the target appliance transmits the completion state by LED blinking for one minute, and then ends the operation.

In the case where the determination results in No, the mobile terminal returns to Step S6331*b*.

The following describes FIG. 673.

In Step S6341*a* from F6304, in the case where "support output start" is included in the infrared remote control code corresponding to the support target appliance, the remote control code for starting support output is issued from the infrared transmission device of the support staff. More detailed information is transmitted in the support output. Blinking Hz may be changed to a maximum level.

In Step S6341*b*, in the case where the support target appliance has the information output button, the support staff presses the button.

In Step S6341*c*, the target appliance changes the mode to a maximum blinking cycle, and outputs support information (use history, failure information, etc.).

In Step S6341*d*, the support staff completes the support for repair or replacement and then notifies the user of the completion.

In Step S6341*e*, the support completion and the support contents are notified from the mobile terminal of the support staff to the server on the cloud, and prediction information of the period to the next maintenance is obtained and notified to the user, before proceeding to F6305.

A method of simultaneously realizing a blinking pattern easily noticeable by the user and optical communication is described below, with reference to FIG. 674.

It is expected that, in optical communication, the frequency is increased in order to increase the amount of information transmitted upon modulation. In the case of transmitting information at a frequency higher than 30 Hz, for example, it is difficult for the user to visually discern what is intended by blinking. In view of this, blinking of a level visually recognizable by the user, such as an operation of turning ON the LED for 120 ms and turning OFF the LED for 120 ms being performed three times, is performed for a predetermined time period, and then transmission is performed at a high frequency for optical communication.

In this way, it is possible to notify the user that information is being transmitted by optical communication, and perform data communication by optical communication using the same LED. Here, the optical communication part may be repeatedly performed an arbitrary number of times (e.g. 5 times). This facilitates recovery from information obtainment error.

The following describes FIG. 675.

In Step S6351*a* from F6305, the home user peripheral appliance performs blinking relatively noticeable by the user such as ON/OFF at 5 Hz or less ((ON for 120 ms and OFF for 120 ms)×3). A trouble is notified to the user in this way. Here, no information may be included.

In Step S6351*b*, the home user peripheral appliance then modulates to a frequency close to a maximum frequency receivable by the receiving terminal for 300 ms (by visible light communication modulation) (e.g. 30 Hz upon reception for camera, 1000 Hz upon reception for optical communication-dedicated diode or the like).

In Step S6351*c*, the receiving mobile terminal receives and analyzes light modulated at a frequency of, for example, 30 Hz or more, and extracts necessary information by discarding light modulated at a lower frequency.

In Step S6351*d*, the mobile terminal displays a UI necessary for the user based on the extracted information, and proceeds to F6306.

An information exchange method using NFC and optical communication is described below, with reference to FIG. 676. Many users feel reluctant to bring a mobile terminal close to, for example, a washlet, using NFC. In this case, a process of performing information exchange by NFC only the first time and then obtaining information by the mobile terminal via optical communication is effective. In optical communication, information can be obtained at a longer distance than in NFC.

In this embodiment, the mobile terminal initially writes the following information to the washlet using NFC:

(1) unique ID of mobile terminal;

(2) identifier for error code transmission in subsequent optical communication;

(3) random number; and (4) current position (X, Y, Z) of mobile terminal.

Here, the receivable performance (e.g. 100 Hz) of the mobile terminal may be written to change the blinking pattern of the washlet.

There are user demands that, of the information transmitted via optical communication, the history information such as the number of uses, the time period, and the power saving setting should be kept confidential. In view of such demands, the random number and the mobile terminal ID necessary for encryption are exchanged by NFC, and the above-mentioned information is encrypted based on the exchanged information and added to transmission data in optical communication. This has an advantageous effect of allowing the information to be viewed only in the mobile terminal of the user.

FIG. 677 is a diagram showing an example of a message when transmitting information from the washlet and screen display information. In the screen display, the encrypted part has a key mark, and is not displayed unless the user presses the display button. Here, the user authentication function of the mobile terminal itself may also be used to further lock the information. For example, password input may also be employed so that the screen changes upon password input. This prevents anyone other than the user from obtaining information using the mobile terminal.

The following describes FIG. 678.

In Step S6361*a* from F6306, the user touches the mobile terminal to the RFID tag of the washlet, to write the unique ID of the mobile terminal, the random number, and the current position (X, Y, Z) of the mobile terminal from the mobile terminal. This eliminates the need to touch the mobile terminal to the washlet for NFC from the second time.

In Step S6361*b*, the washlet starts blinking the LED for optical communication, when triggered by a failure or the user pressing the optical communication button.

In Step S6361*c*, the washlet encrypts, using the ID and the random number obtained from the mobile terminal, information such as the number of uses and the date and time in the information modulated to blinking, and transmits the information.

In Step S6361*d*, the user points the mobile terminal to the washlet. The mobile terminal obtains the data, and decrypts the encrypted part using the information exchanged in NFC.

In Step S6361*e*, the mobile terminal displays the unencrypted part, and displays the button for inquiring whether or not to display the encrypted part, before proceeding to F6307.

In FIG. 679, the mobile terminal obtains information from the washlet during communication by NFC between the washlet and the mobile terminal, and uses the obtained information to perform optical communication from the second time.

The user touches the mobile terminal to the NFC tag of the washlet beforehand to obtain: a cryptography key: and information of the washlet such as an appliance ID, and output an identifier indicating that optical communication is supported. Based on this information, the mobile terminal recognizes that the target washlet subsequently transmits information by optical communication and the information can be obtained. The mobile terminal also recognizes that, in the case where the information is encrypted, it can be decrypted using the exchanged cryptography key.

The number of touches by NFC may be limited beforehand, to restrict future issuance of the cryptography key in NFC. Though the number limitation is cleared by the reset key, information leakage can be prevented by also clearing the history information in such a case.

In the case where the identifier indicating support for optical communication is ON, the mobile terminal adds the washlet to candidates when narrowing down the peripheral appliances capable of optical communication based on the position information.

In the case where the identifier indicating support for optical communication is not included in the information, the mobile terminal inquires of the server on the cloud (server for managing appliance information of home appliances and the like) using the appliance ID, to obtain information of whether or not optical communication is supported.

The following describes FIG. 680. In Step S6371*a* from F6307, the user touches the mobile terminal to the RFID tag of the washlet, to obtain the ID, the position information (X, Y, Z), and the cryptography key from the washlet (in the case of not writing information to the washlet).

In Step S6371*b*, the washlet starts blinking the LED for optical communication, when triggered by a failure or the user pressing the optical communication button.

In Step S6371*c*, the washlet encrypts, using the cryptography key held in the washlet, the history information such as the number of uses and the date and time in the information modulated to LED blinking, and transmits the information.

In Step S6371*d*, the user points the mobile terminal to the washlet, and the mobile terminal obtains the data and decrypts the encrypted part using the information exchanged in NFC.

In Step S6371*e*, the mobile terminal displays the unencrypted part, and displays the button for inquiring whether or not to display the encrypted part, before proceeding to F6308.

FIG. 681 is a diagram showing a method whereby an appliance ID is transmitted in segments to reduce a loss of time for receiving the appliance ID until important information such as an error code is obtained. In this embodiment, in the case where the target peripheral appliance can be specified by the mobile terminal based on the position information, it is unnecessary to obtain the appliance ID. The code and the appliance can be specified by one code obtainment operation as shown in FIG. 681, enabling necessary information to be obtained and presented to the user more quickly.

In the case where the appliance cannot be specified, the necessary information is obtained by three information obtainment operations.

When transmitting the divided appliance ID, an identifier indicating the division may be added to the beginning of the information.

The following describes FIG. 682.

In Step S6381*a* from F6308, when transmitting information by LED blinking, the washlet transmits the information among which important information such as error code is not divided and other information is finely divided.

In Step S6381*b*, the mobile terminal narrows down the target appliances based on the position information of the mobile terminal. For example, the mobile terminal determines whether or not the peripheral appliances near the current position of the mobile terminal are narrowed down to one washlet.

In the case where the determination results in Yes, the mobile terminal proceeds to Step S6381*c*, and compares the appliance and the error code to determine whether or not the error code is code that can be outputted from the washlet.

In the case where the determination results in Yes, the mobile terminal proceeds to F6309. This eliminates the need to obtain the appliance ID, and so contributes to faster display to the user. In the case where the determination in Step S6381*b* or S6381*c* results in No, the user points the mobile terminal to the washlet until necessary information (including the appliance ID) can be obtained in Step S6381*d*. The mobile terminal then proceeds to F6309.

The following describes FIG. 683.

In Step S6391*a* from F6309, the mobile terminal transmits the ID of the target appliance and the obtained information to the server on the cloud, and downloads the corresponding user presentation information (the server on the cloud corresponds to a support site in which the user is registered, a manufacturer support site determined based on the appliance ID, or the like).

In Step S6391*b*, in the case where the obtained user presentation information is URL, the mobile terminal accesses the website. In the case where the obtained user presentation information is text, image, application, or the like, the mobile terminal displays the text, image, application, or the like.

In Step S6391*c*, in the case where the target appliance needs handling for a failure, filter replacement, or the like, the mobile terminal presents the handling method to the user, and then proceeds to F6310.

FIG. 684 is a diagram for describing a method of, in the case where the mobile terminal can obtain the position information of the target appliance by optical communication, correcting the position information of the mobile terminal estimated in the mobile terminal, based on the obtained position information.

As shown in the drawing, an area in which transmission information of a target appliance by optical communication is receivable is an area radiating outward from an air conditioner with a predetermined angle. This area depends on the position or directivity of the LED in the housing, and so is different according to model.

Therefore, a server or the like manages outputted angle information as information for calculating a possible area, and transmits the information according to a request from the mobile terminal.

Consider the case where the mobile terminal is not present in the possible area defined from the angle information. This contradicts with the fact that the mobile terminal can receive optical communication information. Hence, the current position information of the mobile terminal is corrected to within the possible area.

The following describes FIG. 685.

In Step S6400*a* from F6310, the mobile terminal determines whether or not the mobile terminal can obtain the information for specifying the target appliance, the position information of the target appliance, and the installation orientation information of the target appliance.

In the case where the determination in Step S6400*a* results in Yes, the mobile terminal proceeds to Step S6400*b*. The mobile terminal transmits the ID information (may transmit only the model number) of the target appliance to the server on the cloud, to specify the shape and the illumination location of the target appliance.

In Step S6400*c*, the mobile terminal specifies the possible area at the time when illumination can be received, based on the illumination location and the position of the target appliance.

In Step S6400*d*, in the case where the current position estimated in the mobile terminal is not within the possible area, the mobile terminal corrects the current position to the closest position within the possible area. The position to which the current position is corrected may be another position, such as in front of the target peripheral appliance or the like, as long as it is within the possible area, and may be predetermined or selected through learning.

In Step S6400*e*, the mobile terminal determines whether or not the process with regard to the state of the target appliance is completed, according to the received information. In the case where the determination in Step S6400*e* results in Yes, the mobile terminal ends the process.

In the case where the determination in Step S6400*a* results in No, the mobile terminal returns to Step S6400*a*.

In the case where the determination in Step S6400*e* results in No, the mobile terminal proceeds to F6311.

Thus, when a peripheral appliance such as a home appliance transmits information by an optical communication technology such as visible light communication, the information transmitted from the peripheral appliance can be obtained by sensing a light emitting pattern of an LED through the use of a mobile terminal of a user such as a smartphone. Especially in the case where the peripheral appliance of the user, such as a home appliance in a home, needs to notify the user of information due to a failure or a state change, the information can be notified at low cost without particularly using an expensive module such as a display. The information can then be presented to the user with a sufficiently rich UI.

A method of further correcting the position information of the mobile terminal based on the person position information obtainable by the home appliances is described below, with reference to FIGS. 686 and 687.

An air conditioner 8001 includes an optical sensor 8009 for detecting a position (direction, distance) of a person 8023, and so is capable of detecting relative position information of the person with respect to the air conditioner.

Relative position information 8002 of the person obtained using an optical sensor 8010 or a CCD sensor 8011 changeable in direction is transmitted to wind direction control means 8004 and air volume control means 8020 of the air conditioner, to realize a comfortable indoor temperature. Moreover, person position information 8014 is transmitted to a mobile terminal 8022 via communication means 8000, a network 8019, and wireless communication means 8018. In detail, position information 8015 of the home appliance such as the air conditioner, relative position information 8016 of the person with respect to the home appliance, and direction data 8013 such as θ and distance data 8013*a* of the person with respect to the home appliance are transmitted to the mobile terminal 8022.

The mobile terminal 8022 includes a three-axis acceleration sensor and a three-axis angular velocity sensor, and so is capable of detecting whether (1) the mobile terminal 8022 is placed in the cloths of the person 8023, (2) the mobile terminal 8022 is held by the hand of the person 8023, or (3) the mobile terminal 8022 is away from the person 8023.

In the case of (1) or (2), the distance between the person and the mobile phone can be determined as extremely short, so that second position information of the mobile phone can be obtained using the position data 8014 from the home appliance.

A mobile phone that performs position detection using position detection means such as a GPS, a nine-axis gyro sensor for autonomous navigation, a geomagnetic sensor, and an acceleration sensor has first position information. However, there is a problem that the accuracy of position detection decreases when the mobile phone enters a building, as the GPS radio wave is weakened and the error of the position detection means is accumulated.

In the present invention, even in the case where a tag of a home appliance or a property such as a restaurant having an ID does not include actual position information, an appliance ID, a property ID, or map identification information (e.g. Japan MAP-ID) is included in the home appliance position information 8015, and position information corresponding to the ID is transmitted to a server and recorded in a memory of the server. Accordingly, by transmitting the ID to the server, the mobile terminal 8022 can obtain the actual position information such as latitude and longitude of the fixed home appliance such as an air conditioner or the property such as a restaurant. The physical position information of the device or the property corresponding to the ID may be held in the communication terminal beforehand.

Through the use of this position information and the relative position information 8016 of the person with respect to the home appliance, the property, the building, or the like, the actual position information of the communication terminal is obtained. In this case, the accuracy of the position information of the tag varies depending on the position measurement device or environment, in the home appliance such as an air conditioner or the property such as a restaurant.

Accordingly, the tag records accuracy information of the position information. When the position accuracy information of the home appliance is higher than the accuracy information of the mobile terminal, the position information of the mobile terminal is corrected. When the position accuracy information of the home appliance is lower than the accuracy information of the mobile terminal, the position information of the mobile terminal is not corrected.

By obtaining the physical position information of the mobile terminal in this way, it is possible to correct the physical position information of the mobile terminal. For highest accuracy, the NFC reader of the mobile terminal is brought closer to or contacts the NFC tag of the home appliance or the property. Since the distance between the home appliance or the property and the mobile terminal is extremely short such as 1 to 2 cm in this case, the position information of the original accuracy of the tag can be obtained.

Though FIG. 686 shows the use of an air conditioner as the home appliance to describe the advantageous effects of the present invention, the present invention is not limited to an air conditioner. In FIG. 687, the operation of the air conditioner 8001 has already been described in FIG. 686. In the case of a TV 8037, it is expected that a person sensor 8036 for detecting a person is increasingly installed in the TV 8037 in the future. As one operation, when there is no person in front of the TV, the TV is powered OFF or switched to a low power mode, for power saving. This contributes to reduced power consumption. There is a high possibility that the method is extensively used in the future.

As another operation, in the case of a 3D TV, the position of the human eye or the like, such as direction, angle, and distance, is detected, and 3D information of the display is controlled so that optimum 3D video is attained when the user views the TV in the corresponding direction.

In either case, relative position information 8033 between the person and the TV can be obtained from the person sensor 8036 of the TV, so that the position information of the person in the home can be obtained once the position information of the TV is known.

To obtain the position information of the TV, the TV is provided with the NFC tag, and performs proximity communication with the mobile terminal having the position information detection function. As a result, the TV holds the position information of the TV. The position information may be held in the server in association with the appliance ID of the TV.

Thus, the relative position information 8033 of the person and the position information 8034 of the home appliance are transmitted to the mobile terminal of the person such as a smartphone, via the network 8031 in the home and a wireless network 8030 of a wireless transmission/reception device such as a wireless LAN access point. In the next step, the mobile terminal 8035 obtains the position information 8032, and corrects the physical position information of the mobile terminal 8035.

This produces an advantageous effect that the position of the mobile terminal can be corrected even in the home not reached by GPS.

A microwave 8042*a*, a refrigerator 8050, a rice cooker 8051, and a washing machine 8050 each have a door. Hence, operation data 8041, such as door open/close data 8042, indicating that the person actually operates the appliance can be obtained. Detecting the operation means that the person is in front of the appliance. This can be possibly applied as one type of person sensor.

The operation data 8041 is transmitted together with the position information 8033 of the home appliance, to a mobile terminal 8035*a* such as a smartphone via a network 8031*a* and a wireless network 8030*a* such as a wireless LAN access point.

Through the use of the above-mentioned method, the mobile terminal 8035*a* can determine that the person holds the mobile terminal. In the case where the person holds the mobile terminal, it can be detected in the next step that there is a high possibility of the person being in front of the home appliance, from the operation data 8041. Therefore, the position information of the mobile terminal can be obtained from the position information 8033 of the home appliance.

In the case where the accuracy of the position information 8033 is higher than the accuracy of the position information of the mobile terminal according to the accuracy identification information indicating the position information accuracy, the position information is corrected. This correction enables highly accurate position information detection in the home, which has conventionally been difficult. In such a case, since each home appliance is provided with the NFC function, an advantageous effect of obtaining highly accurate home appliance position information can be achieved.

The physical position information may be recorded in the memory unit of the NFC tag, or recorded in the server in association with the appliance ID. Identification information for identifying whether or not the position information can be recorded in the server is stored in the memory unit.

This produces an advantageous effect that the mobile terminal can instantly detect that the position information of the home appliance is stored in the server. The method is applicable to the position information correction and the like in all of the above embodiments, though its description is omitted here. The method is likely to constitute an extremely effective inventive technology in future environments where home appliances cooperate with servers via networks.

In the embodiments of the present invention, the wireless communication terminal may obtain position information from an external terminal using proximity wireless communication means (NFC unit). Typically, the wireless communication terminal cannot obtain accurate position information indoors. This being so, for example, the position information may be stored in the external terminal installed at a specific location. The wireless communication terminal may then obtain the position information from the external terminal by the proximity wireless communication means. Thus, the position information of the wireless communication terminal can be obtained even indoors.

The external terminal may also transmit identification information of the external communication terminal to the wireless communication terminal. The same advantageous effect can still be achieved with this structure. The following structure is also possible. The external terminal transmits the identification information of the external communication terminal to the wireless communication terminal, the wireless communication terminal transmits the identification information to the server, the server converts the identification information to the position information, and the wireless communication terminal receives the position information.

With this structure, the server can transmit the information relating to the current position information of the wireless communication terminal, to the wireless communication terminal. Moreover, the information transmitted from the wireless communication terminal to the server may include preference information based on the operation history, the search history, and the like of the wireless communication terminal, and the information transmitted from the server to the wireless communication terminal may include the current position information of the wireless communication terminal and information matching the preference information. By adding the preference information of the wireless communication terminal, it is possible to transmit information more useful to the operator of the wireless communication terminal.

Furthermore, with use of an imaging device including proximity wireless communication means, proximity wireless communication means, and high-speed wireless communication such as wireless LAN, the wireless communication terminal may transmit photograph data recorded in the imaging device to an Internet service, by communication means of the wireless communication terminal.

That is, the imaging device transmits, to the wireless communication terminal, connection information of high-speed wireless communication such as wireless LAN, photographs recorded in the imaging device and to be uploaded, information identifying the Internet service to which the photographs are uploaded, and login information of the Internet service.

As a specific procedure, first the imaging device transmits connection start information of high-speed wireless communication such as wireless LAN to the wireless communication terminal, by the proximity wireless communication means. This information may be mere information indicating to start standardized mutual connection processing, or channel information, cryptography key information, or the like for connection. The imaging device transmits the photographs to be uploaded, the information identifying the Internet service to which the photographs are uploaded, and the login information such as ID or password of the Internet service, to the wireless communication terminal.

The wireless communication terminal accesses the Internet service and transmits the photographs to be uploaded, based on these information. As an alternative, first, only thumbnail information of the photographs to be uploaded may be transmitted to the wireless communication terminal. Then, after final photographs to be transmitted are selected in the wireless communication terminal, the upload to the Internet service is started.

The information identifying the Internet service to which the photographs are uploaded and the login information such as ID or password of the Internet service may also be transmitted by the proximity wireless communication means.

By setting the photographs to be uploaded and the Internet service as the upload destination in the imaging device beforehand and starting the upload upon communication by the proximity wireless communication means, it is possible to upload the photographs promptly. Besides, since the wireless communication terminal has more connection means to the Internet than the imaging device, photographs can be uploaded to the Internet service from a wider variety of places.

Though the present invention has been described in detail by way of the embodiments, the above description is merely an example of the present invention in all respects, and the present invention is not limited to such. Various improvements and modifications may be made on the embodiments without departing from the scope of the present invention.

For example, the present invention may be realized not only as an apparatus or a device (system), but also as a method including steps corresponding to the processing units of the apparatus, a program causing a computer to execute such steps, a computer-readable recording medium such as a CD-ROM on which the program is recorded, or information, data, or a signal indicating the program. Such a program, information, data, or signal may be distributed via a network such as the Internet.

The present invention also includes any other modifications to the embodiments that can be conceived by a person skilled in the art and any combinations of components in the embodiments and variations, without departing from the scope of the present invention.

The present invention allows a receiving device (apparatus) such as a TV to receive data such as images from a server by a simple procedure. Therefore, the present invention is useful in any system for simplifying operations of a display device (apparatus) such as a TV or a PC for obtaining data via the Internet. Moreover, the communication device according to the present invention is applicable to any device that is provided with a RF-ID tag in which identification information and a virtual machine program are stored. For example, the communication device may be applied to electronic appliances such as a camera, home appliances such as a rice cooker and a refrigerator, and daily commodities such as a toothbrush.

INDUSTRIAL APPLICABILITY

The communication device according to the present invention has a motion sensor and obtains the pointing direction of the communication device, and therefore is useful as a communication device that easily provides an extended user interface for home appliances.

REFERENCE SIGNS LIST

100 Communication system
101, 1201, 6002 Terminal apparatus
102, 1202 Mobile device
103 Internet
104 Server apparatus
105 Controller
106 Main memory
107 Proximity wireless communication unit
108, 109 Antenna
110 Display unit
111 Key
201 Proximity wireless communication unit
202 Proximity wireless detection unit
203 Apparatus information obtainment unit
204 External communication unit
205 Sensor unit
206 Position sensing unit
207 Direction sensing unit
208 Directional space obtainment unit
209 Apparatus specification unit
210 Movement determination unit
211 Remove control information setting unit
212 Remote control information obtainment unit
213 Storage unit
214 Display information decision unit
215 Operation information transmission unit
216 Operation history obtainment unit
217 Sound sensor
219 Communication antenna
220 Receiving unit
221 Transmitting unit
222 Communication control unit
223 Acceleration sensor
224 GPS sensor
225 Angular velocity sensor
226 Orientation sensor
227 Absolute position obtainment unit
228 Relative position obtainment unit
229 Position setting unit
301 Apparatus number determination unit
302 Apparatus direction calculation unit
303 Difference calculation unit
304, 306, 309 Apparatus decision unit
305 Space information storage unit
307 Apparatus candidate display unit
308 User input obtainment unit
310 Pitch angle obtainment unit
311 Apparatus pitch angle storage unit
1203 2D bar-code

The invention claimed is:

1. A wireless communication terminal comprising:

a position information obtainment unit configured to estimate terminal position information which is position information of the wireless communication terminal, using an internal sensor;

a peripheral apparatus information storage unit configured to store, as unique information corresponding to a peripheral apparatus registered beforehand, at least an apparatus ID, position information, and an identifier of the peripheral apparatus, the identifier indicating whether or not the peripheral apparatus supports optical communication for modulating information as a light emitting pattern and transmitting the modulated information;

an imaging device that obtains light generated by the peripheral apparatus modulating the information as the light emitting pattern;

an optical communication information obtainment unit configured to decode the information from the light emitting pattern of the light obtained by the imaging device;

a server cooperative communication unit configured to notify the apparatus ID obtained by the optical communication information obtainment unit and state information which is information indicating a state of the apparatus to a server via a network, and obtain user presentation information from the server, the user presentation information being at least one of screen information, sound information, an application, a script, a URL, and link information to another server that correspond to the state information; and a peripheral apparatus limiting unit configured to select a peripheral apparatus capable of the optical communication based on a current position of the wireless communication terminal, from the terminal position information and the peripheral apparatus information, wherein the optical communication information obtainment unit is configured to complement the information received by the optical communication, using information corresponding to the selected peripheral apparatus.

2. The wireless communication terminal according to claim 1, wherein the wireless communication terminal compares the information of the selected peripheral apparatus and the information already received by the optical communication, and complement the information before obtaining all information transmitted by the optical communication.

* * * * *